US012141871B1

(12) United States Patent
James et al.

(10) Patent No.: US 12,141,871 B1
(45) Date of Patent: *Nov. 12, 2024

(54) SYSTEM, METHOD AND PROGRAM PRODUCT FOR GENERATING AND UTILIZING STABLE VALUE DIGITAL ASSETS

(71) Applicant: Gemini IP, LLC, New York, NY (US)

(72) Inventors: Daniel William Halley James, Brooklyn, NY (US); Brandon Arvanaghi, Washington, DC (US); Ismail Cem Paya, Portland, OR (US); Eric Winer, New York, NY (US); Cameron Howard Winklevoss, New York, NY (US); Tyler Howard Winklevoss, New York, NY (US); Matthew Jeffrey Werner, Oakland, CA (US); MD Raqibul Islam, Brooklyn, NY (US); Brian Andrew KimJohnson, New York, NY (US); Max Rosner, Brooklyn, NY (US)

(73) Assignee: Gemini IP, LLC, New York, NY (US)

( * ) Notice: Subject to any disclaimer, the term of this patent is extended or adjusted under 35 U.S.C. 154(b) by 747 days.

This patent is subject to a terminal disclaimer.

(21) Appl. No.: 17/327,376

(22) Filed: May 21, 2021

Related U.S. Application Data

(63) Continuation-in-part of application No. 17/159,832, filed on Jan. 27, 2021, which is a continuation-in-part (Continued)

(51) Int. Cl.
*G06Q 40/06* (2012.01)
*G06F 16/18* (2019.01)
(Continued)

(52) U.S. Cl.
CPC ......... *G06Q 40/06* (2013.01); *G06F 16/1815* (2019.01); *G06F 16/1834* (2019.01);
(Continued)

(58) Field of Classification Search
CPC ................ G06Q 20/065–0658; G06Q 20/389
See application file for complete search history.

(56) References Cited

U.S. PATENT DOCUMENTS

| | | | |
|---|---|---|---|
| 109,992 | A | 12/1870 | Hart |
| 114,438 | A | 5/1871 | Harvard |

(Continued)

FOREIGN PATENT DOCUMENTS

| | | | |
|---|---|---|---|
| CA | 2627540 | A1 | 9/2009 |
| CN | 103927656 | A | 7/2014 |

(Continued)

OTHER PUBLICATIONS

Office Action for U.S. Appl. No. 17/248,592, mailed on Aug. 18, 2023, Winklevoss, “Systems for Purchasing Shares in an Entity Holding Digital Math-Based Assets”, 8 pages.

(Continued)

*Primary Examiner* — Jay Huang
(74) *Attorney, Agent, or Firm* — Lee & Hayes, P.C.

(57) ABSTRACT

The present invention generally relates to the use of a stable value digital asset to pay dividends for securities and other financial instruments tied to a blockchain.

34 Claims, 321 Drawing Sheets

Related U.S. Application Data of application No. 16/687,230, filed on Nov. 18, 2019, now Pat. No. 11,308,487, application No. 17/327,376 is a continuation-in-part of application No. 16/670,624, filed on Oct. 31, 2019, now Pat. No. 11,562,333, said application No. 17/159,832 is a continuation-in-part of application No. 16/550,152, filed on Aug. 23, 2019, application No. 17/327,376 is a continuation-in-part of application No. 16/518,660, filed on Jul. 22, 2019, now Pat. No. 11,334,883, and a continuation-in-part of application No. 16/455,223, filed on Jun. 27, 2019, now Pat. No. 11,017,391, said application No. 17/159,832 is a continuation-in-part of application No. 16/455,223, filed on Jun. 27, 2019, now Pat. No. 11,017,391, said application No. 16/550,152 is a continuation-in-part of application No. 16/452,187, filed on Jun. 25, 2019, now Pat. No. 11,200,569, said application No. 16/518,660 is a continuation-in-part of application No. 16/452,187, filed on Jun. 25, 2019, now Pat. No. 11,200,569, application No. 17/327,376 is a continuation-in-part of application No. 16/452,187, filed on Jun. 25, 2019, now Pat. No. 11,200,569, said application No. 16/687,230 is a continuation-in-part of application No. 16/437,841, filed on Jun. 11, 2019, now Pat. No. 10,540,654, said application No. 16/452,187 is a continuation-in-part of application No. 16/437,841, filed on Jun. 11, 2019, now Pat. No. 10,540,654, which is a continuation-in-part of application No. 16/421,975, filed on May 24, 2019, now Pat. No. 10,540,653, said application No. 16/670,624 is a continuation of application No. 16/407,426, filed on May 9, 2019, now Pat. No. 10,540,640, said application No. 16/421,975 is a continuation of application No. 16/293,531, filed on Mar. 5, 2019, now Pat. No. 10,373,158, which is a continuation-in-part of application No. 16/282,955, filed on Feb. 22, 2019, now Pat. No. 11,522,700, which is a continuation-in-part of application No. 16/280,788, filed on Feb. 20, 2019, now Pat. No. 11,139,955, said application No. 16/293,531 is a continuation-in-part of application No. 16/036,469, filed on Jul. 16, 2018, now Pat. No. 10,929,842, said application No. 16/407,426 is a continuation of application No. 16/020,534, filed on Jun. 27, 2018, now Pat. No. 10,373,129, said application No. 16/036,469 is a continuation-in-part of application No. 16/020,534, filed on Jun. 27, 2018, now Pat. No. 10,373,129, said application No. 16/293,531 is a continuation-in-part of application No. 16/020,534, filed on Jun. 27, 2018, now Pat. No. 10,373,129, said application No. 16/280,788 is a continuation-in-part of application No. 15/973,140, filed on May 7, 2018, now abandoned, and a continuation-in-part of application No. 15/973,175, filed on May 7, 2018, now abandoned, said application No. 16/455,223 is a continuation of application No. 15/960,040, filed on Apr. 23, 2018, now Pat. No. 10,438,290, said application No. 16/020,534 is a continuation of application No. 15/960,040, filed on Apr. 23, 2018, now Pat. No. 10,438,290, said application No. 16/280,788 is a continuation-in-part of application No. 15/960,040, filed on Apr. 23, 2018, now Pat. No. 10,438,290, said application No. 16/293,531 is a continuation-in-part of application No. 15/960,040, filed on Apr. 23, 2018, now Pat. No. 10,438,290, said application No. 16/020,534 is a continuation of application No. 15/960,040, filed on Apr. 23, 2018, now Pat. No. 10,438,290, said application No. 16/280,788 is a continuation-in-part of application No. 15/920,042, filed on Mar. 13, 2018, now Pat. No. 11,282,139.

(60) Provisional application No. 62/867,091, filed on Jun. 26, 2019, provisional application No. 62/732,347, filed on Sep. 17, 2018, provisional application No. 62/728,441, filed on Sep. 7, 2018, provisional application No. 62/721,983, filed on Aug. 23, 2018, provisional application No. 62/764,977, filed on Aug. 17, 2018, provisional application No. 62/764,978, filed on Aug. 17, 2018, provisional application No. 62/702,265, filed on Jul. 23, 2018, provisional application No. 62/689,563, filed on Jun. 25, 2018, provisional application No. 62/684,023, filed on Jun. 12, 2018, provisional application No. 62/683,412, filed on Jun. 11, 2018, provisional application No. 62/680,775, filed on Jun. 5, 2018, provisional application No. 62/660,655, filed on Apr. 20, 2018, provisional application No. 62/647,353, filed on Mar. 23, 2018, provisional application No. 62/642,931, filed on Mar. 14, 2018, provisional application No. 62/642,946, filed on Mar. 14, 2018, provisional application No. 62/638,679, filed on Mar. 5, 2018, provisional application No. 62/629,417, filed on Feb. 12, 2018.

(51) Int. Cl.

| | |
|---|---|
| ***G06F 16/182*** | (2019.01) |
| ***G06F 16/27*** | (2019.01) |
| ***G06Q 20/06*** | (2012.01) |
| ***G06Q 20/10*** | (2012.01) |
| ***G06Q 20/22*** | (2012.01) |
| ***G06Q 20/38*** | (2012.01) |
| ***H04L 9/06*** | (2006.01) |
| ***H04L 9/32*** | (2006.01) |

(52) U.S. Cl.

CPC .......... *G06F 16/27* (2019.01); *G06Q 20/065* (2013.01); *G06Q 20/102* (2013.01); *G06Q 20/223* (2013.01); *G06Q 20/389* (2013.01); *H04L 9/0637* (2013.01); *H04L 9/3213* (2013.01)

(56) References Cited

U.S. PATENT DOCUMENTS

| | | | |
|---|---|---|---|
| 4,790,431 | A | 12/1988 | Reel et al. |
| 5,623,547 | A | 4/1997 | Jones |
| 5,675,649 | A | 10/1997 | Brennan et al. |
| 5,799,287 | A | 8/1998 | Dembo |
| 5,950,176 | A | 9/1999 | Keiser et al. |
| 6,021,257 | A | 2/2000 | Chikauchi |
| 6,157,920 | A | 12/2000 | Jakobsson et al. |
| 6,505,174 | B1 | 1/2003 | Keiser et al. |
| 6,523,012 | B1 | 2/2003 | Glassman et al. |
| 6,583,712 | B1 | 6/2003 | Reed et al. |
| 7,136,834 | B1 | 11/2006 | Merrin et al. |
| 7,167,565 | B2 | 1/2007 | Rajasekaran |
| 7,308,428 | B1 | 12/2007 | Federspiel et al. |
| 7,330,538 | B2 | 2/2008 | Dunsmuir |
| 7,356,500 | B1 | 4/2008 | Waelbroeck et al. |
| 7,391,865 | B2 | 6/2008 | Orsini et al. |
| 7,428,506 | B2 | 9/2008 | Waelbroeck et al. |
| 7,487,123 | B1 | 2/2009 | Keiser et al. |
| 7,565,313 | B2 | 7/2009 | Waelbroeck et al. |
| 7,647,264 | B2 | 1/2010 | Hatheway et al. |
| 7,677,974 | B2 | 3/2010 | Van Luchene |

(56) References Cited

U.S. PATENT DOCUMENTS 7,680,715 B2 3/2010 Waelbroeck et al.
7,685,052 B2 3/2010 Waelbroeck et al.
7,693,775 B2 4/2010 Korhammer et al.
7,716,484 B1 5/2010 Kaliski, Jr.
7,747,515 B1 6/2010 Merrin et al.
7,769,678 B2 8/2010 Toffey
7,778,919 B2 8/2010 Waelbroeck et al.
7,814,000 B2 10/2010 Waelbroeck et al.
7,831,507 B2 11/2010 Merrin et al.
7,848,991 B1 12/2010 Buck
7,848,993 B1 12/2010 Buck
7,865,425 B2 1/2011 Waelbroeck et al.
7,870,058 B2 1/2011 Maltzman
7,870,059 B2 1/2011 Shapiro et al.
7,870,062 B2 1/2011 Waelbroeck et al.
7,873,573 B2 1/2011 Realini
7,877,318 B2 1/2011 Waelbroeck et al.
7,882,013 B2 2/2011 Shapiro et al.
7,882,014 B2 2/2011 Shapiro et al.
7,882,015 B2 2/2011 Waelbroeck et al.
7,890,417 B2 2/2011 Hanson et al.
7,895,112 B2 2/2011 Richmann et al.
7,899,726 B2 3/2011 Harris
7,904,376 B2 3/2011 Shapiro et al.
7,908,203 B2 3/2011 Shapiro et al.
7,908,205 B2 3/2011 Waelbroeck et al.
7,908,206 B2 3/2011 Waelbroeck et al.
7,917,425 B2 3/2011 Waelbroeck et al.
7,933,827 B2 4/2011 Richmann et al.
7,996,261 B1 8/2011 Waelbroeck et al.
7,999,748 B2 8/2011 Ligtenberg et al.
8,005,743 B2 8/2011 Tupper et al.
8,010,438 B2 8/2011 Waelbroeck et al.
8,015,099 B2 9/2011 Reid
8,019,665 B2 9/2011 Hausman
8,041,628 B2 10/2011 Waelbroeck et al.
8,046,290 B2 10/2011 Fitzpatrick et al.
8,055,576 B2 11/2011 Merrin et al.
8,065,217 B2 11/2011 Beddis
8,069,106 B2 11/2011 Waelbroeck et al.
8,073,763 B1 12/2011 Merrin et al.
8,082,205 B2 12/2011 Lutnick et al.
8,095,455 B2 1/2012 Shapiro et al.
8,095,456 B2 1/2012 Waelbroeck et al.
8,103,579 B1 1/2012 Berkeley, III et al.
8,108,278 B2 1/2012 Tzekin et al.
8,108,283 B2 1/2012 Dimitri et al.
8,108,299 B1 1/2012 Waelbroeck et al.
8,117,105 B2 2/2012 Ford et al.
8,117,609 B2 2/2012 Lantz et al.
8,139,770 B2 3/2012 Zheng et al.
8,140,418 B1 3/2012 Casey
8,156,036 B1 4/2012 Waelbroeck et al.
8,165,954 B2 4/2012 Waelbroeck et al.
8,224,702 B2 7/2012 Mengerink et al.
8,229,855 B2 7/2012 Huang et al.
8,229,859 B2 7/2012 Samid
8,239,330 B2 8/2012 Montero et al.
8,244,622 B2 8/2012 Hughes, Jr. et al.
8,249,965 B2 8/2012 Tumminaro
8,255,297 B2 8/2012 Morgenstern et al.
8,266,045 B2 9/2012 Waelbroeck et al.
8,271,375 B2 9/2012 Mahoney et al.
8,275,692 B2 9/2012 Cartledge et al.
8,280,797 B2 10/2012 Hatheway et al.
8,285,629 B2 10/2012 Lutnick et al.
8,301,542 B2 10/2012 Adcock et al.
8,306,910 B2 11/2012 Wilkes
8,311,920 B2 11/2012 Lutnick et al.
8,321,323 B2 11/2012 Lutnick et al.
8,326,751 B2 12/2012 Driemeyer et al.
8,346,651 B2 1/2013 Freitas et al.
8,352,326 B2 1/2013 Betzler et al.
8,359,253 B2 1/2013 Waelbroeck et al.
8,359,260 B2 1/2013 Merrin et al.
8,380,612 B2 2/2013 Hanson et al.
8,386,362 B2 2/2013 Failla et al.
8,386,373 B2 2/2013 Fitzpatrick et al.
8,452,703 B2 5/2013 O'Leary et al.
8,494,949 B2 7/2013 Gilbert et al.
8,515,857 B2 8/2013 Lutnick et al.
8,521,627 B2 8/2013 Ford et al.
8,548,898 B2 10/2013 Merrin et al.
8,560,431 B2 10/2013 Lutnick et al.
8,566,213 B2 10/2013 Sweeting et al.
8,577,772 B2 11/2013 Heckman et al.
8,583,544 B2 11/2013 Ford et al.
8,606,685 B2 12/2013 Keiser et al.
8,620,759 B1 12/2013 Virgilio et al.
8,630,951 B2 1/2014 Wilkes
8,635,144 B2 1/2014 Waelbroeck et al.
8,688,525 B2 4/2014 Minde
8,688,563 B2 4/2014 Mehew et al.
8,712,903 B2 4/2014 Lutnick et al.
8,712,914 B2 4/2014 Lyons et al.
8,719,131 B1 5/2014 Roth et al.
8,732,065 B1 5/2014 Hayes, Jr.
8,738,518 B2 5/2014 Rodin
8,744,952 B2 6/2014 Mortimer et al.
8,744,954 B2 6/2014 Buck
8,751,362 B1 6/2014 Lutnick et al.
8,768,819 B2 7/2014 Lutnick et al.
8,775,298 B2 7/2014 Waelbroeck et al.
8,886,561 B2 11/2014 Gilbert et al.
8,959,031 B2 2/2015 Merrin et al.
8,977,565 B2 3/2015 Alderucci et al.
9,064,256 B2 6/2015 Foley et al.
9,704,143 B2 7/2017 Walker et al.
9,727,909 B2 8/2017 Mackay
9,794,074 B2 10/2017 Toll et al.
9,811,869 B2 11/2017 Wilson et al.
9,853,977 B1 12/2017 Laucius et al.
9,892,460 B1 2/2018 Winklevoss et al.
9,898,782 B1 2/2018 Winklevoss et al.
9,942,231 B1 4/2018 Laucius et al.
9,965,804 B1 5/2018 Winklevoss et al.
9,965,805 B1 5/2018 Winklevoss et al.
10,026,082 B2 7/2018 Davis
10,055,715 B1 8/2018 Grassadonia et al.
10,063,548 B1 8/2018 Laucius et al.
10,068,228 B1 9/2018 Winklevoss et al.
10,084,762 B2 9/2018 Versteeg et al.
10,146,792 B1 12/2018 Dobrek et al.
10,158,480 B1 12/2018 Winklevoss et al.
10,255,635 B1 4/2019 Winklevoss et al.
10,269,009 B1 4/2019 Winklevoss et al.
10,269,084 B2 4/2019 Wilson et al.
10,325,257 B1 6/2019 Winklevoss et al.
10,354,325 B1 7/2019 Skala et al.
10,373,129 B1 8/2019 James et al.
10,373,158 B1 8/2019 James et al.
10,438,290 B1 10/2019 Winklevoss et al.
10,484,376 B1 11/2019 Laucius et al.
10,540,640 B1 1/2020 James et al.
10,540,653 B1 1/2020 James et al.
10,540,654 B1 1/2020 James et al.
10,554,401 B1 2/2020 Lee
10,650,376 B1 5/2020 Winklevoss et al.
10,693,632 B1 6/2020 Winklevoss et al.
10,778,682 B1 9/2020 Laucius et al.
10,915,891 B1 2/2021 Winklevoss et al.
10,929,842 B1 2/2021 Arvanaghi et al.
10,929,929 B1 2/2021 Winklevoss et al.
10,946,283 B1 3/2021 Meilich et al.
10,984,470 B1 4/2021 Winklevoss et al.
10,984,472 B1 4/2021 Winklevoss et al.
10,999,260 B1 5/2021 Silvestri
11,017,381 B1 5/2021 Winklevoss et al.
11,017,391 B1 5/2021 Winklevoss et al.
11,087,313 B1 8/2021 Winklevoss et al.
11,139,955 B1 10/2021 So et al.
11,164,251 B1 11/2021 Skala et al.
11,200,569 B1 12/2021 James et al.
11,308,487 B1 4/2022 Foster et al.

(56) References Cited

U.S. PATENT DOCUMENTS 11,334,883 B1 5/2022 Auerbach et al.
2002/0129248 A1 9/2002 Wheeler et al.
2002/0143614 A1 10/2002 MacLean et al.
2002/0171546 A1 11/2002 Evans et al.
2003/0009413 A1 1/2003 Furbush et al.
2003/0014345 A1 1/2003 Lim
2003/0014749 A1 1/2003 Simons et al.
2003/0033240 A1 2/2003 Balson
2003/0225672 A1 12/2003 Hughes, Jr. et al.
2004/0020870 A1 2/2004 Amburgey
2004/0049464 A1 3/2004 Ohmori et al.
2004/0143710 A1 7/2004 Walmsley
2004/0193657 A1 9/2004 Saito et al.
2004/0223481 A1 11/2004 Juels et al.
2004/0243488 A1 12/2004 Yamamoto et al.
2005/0044022 A1 2/2005 Spirgel et al.
2005/0240510 A1 10/2005 Schweickert
2006/0254815 A1 11/2006 Humphrey et al.
2007/0117615 A1 5/2007 Van Luchene
2007/0146797 A1 6/2007 Sakai et al.
2007/0219869 A1 9/2007 Haines et al.
2007/0271455 A1 11/2007 Nakano et al.
2008/0109280 A1 5/2008 Csoka
2008/0120221 A1 5/2008 Toneguzzo
2008/0140578 A1 6/2008 Felt et al.
2008/0167965 A1 7/2008 Von Nothaus et al.
2008/0215474 A1 9/2008 Graham
2008/0243703 A1 10/2008 Al-Herz et al.
2008/0249957 A1 10/2008 Masuyama et al.
2008/0281444 A1 11/2008 Krieger et al.
2009/0089168 A1 4/2009 Schneck
2009/0094134 A1 4/2009 Toomer et al.
2009/0098939 A1 4/2009 Hamilton, II et al.
2009/0119200 A1 5/2009 Riviere
2009/0132830 A1 5/2009 Haga et al.
2009/0265268 A1 10/2009 Huang et al.
2010/0094771 A1 4/2010 Vanderpal
2010/0174646 A1 7/2010 Cole et al.
2010/0228674 A1 9/2010 Ogg et al.
2010/0250360 A1 9/2010 Ball et al.
2010/0306084 A1 12/2010 Ciptawilangga
2011/0110516 A1 5/2011 Satoh
2011/0112662 A1 5/2011 Thompson et al.
2011/0231913 A1 9/2011 Feng et al.
2011/0270748 A1 11/2011 Graham, III et al.
2011/0302412 A1 12/2011 Deng et al.
2012/0078693 A1 3/2012 Wilkes
2012/0101886 A1 4/2012 Subramanian et al.
2012/0123924 A1 5/2012 Rose et al.
2012/0185395 A1 7/2012 Wilkes
2012/0233470 A1 9/2012 Everett
2012/0239543 A1 9/2012 Ryan
2012/0278200 A1 11/2012 van Coppenolle et al.
2013/0036373 A1 2/2013 Alderfer et al.
2013/0041773 A1 2/2013 Muse
2013/0054471 A1 2/2013 Samid
2013/0061049 A1 3/2013 Irvine
2013/0159699 A1 6/2013 Torkkel
2013/0166455 A1 6/2013 Feigelson
2013/0191277 A1 7/2013 O'Leary et al.
2013/0226827 A1 8/2013 Stevens
2013/0232023 A2 9/2013 Muse
2013/0238478 A1 9/2013 Bruno
2013/0246233 A1 9/2013 Hakim
2013/0254052 A1 9/2013 Royyuru et al.
2013/0311266 A1 11/2013 Vichich et al.
2013/0311348 A1 11/2013 Samid
2013/0317972 A1 11/2013 Morgenstern et al.
2013/0317984 A1 11/2013 O'Leary et al.
2013/0325701 A1 12/2013 Schwartz
2014/0025473 A1 1/2014 Cohen
2014/0032267 A1 1/2014 Smith et al.
2014/0040157 A1 2/2014 Cohen et al.
2014/0081710 A1 3/2014 Rabie
2014/0122903 A1 5/2014 Endo et al.
2014/0141869 A1 5/2014 Shore
2014/0156497 A1 6/2014 Mehew et al.
2014/0164251 A1 6/2014 Loh
2014/0233740 A1 8/2014 Niamut et al.
2014/0279352 A1 9/2014 Schaefer
2014/0297504 A1 10/2014 Bergenudd et al.
2014/0297520 A1 10/2014 Levchin et al.
2014/0310527 A1 10/2014 Veugen et al.
2014/0344015 A1 11/2014 Puertolas-Montanes et al.
2014/0359291 A1 12/2014 Wilson et al.
2015/0032591 A1 1/2015 Jacob
2015/0033301 A1 1/2015 Pianese et al.
2015/0120567 A1 4/2015 Van Rooyen et al.
2015/0120569 A1 4/2015 Belshe et al.
2015/0170112 A1 6/2015 DeCastro
2015/0193744 A1 7/2015 Adleman
2015/0220928 A1 8/2015 Allen
2015/0227897 A1 8/2015 Loera
2015/0244690 A1 8/2015 Mossbarger
2015/0254640 A1 9/2015 Cassano et al.
2015/0262137 A1 9/2015 Armstrong
2015/0262138 A1 9/2015 Hudon
2015/0262139 A1 9/2015 Shtylman
2015/0262140 A1 9/2015 Armstrong
2015/0262141 A1 9/2015 Rebernik et al.
2015/0262168 A1 9/2015 Armstrong
2015/0262171 A1 9/2015 Langschaedel et al.
2015/0262172 A1 9/2015 Rebernik
2015/0262173 A1 9/2015 Durbin et al.
2015/0262176 A1 9/2015 Langschaedel et al.
2015/0294308 A1 10/2015 Pauker et al.
2015/0310424 A1 10/2015 Graham, III
2015/0324787 A1 11/2015 Schaffner
2015/0332283 A1 11/2015 Witchey
2015/0332395 A1 11/2015 Walker et al.
2015/0341422 A1 11/2015 Farnlof et al.
2015/0348015 A1 12/2015 Ren et al.
2015/0348169 A1 12/2015 Harris et al.
2015/0356523 A1 12/2015 Madden
2015/0356555 A1 12/2015 Pennanen
2015/0363777 A1 12/2015 Ronca et al.
2015/0363783 A1 12/2015 Ronca et al.
2015/0379510 A1 12/2015 Smith
2016/0027229 A1 1/2016 Spanos et al.
2016/0028552 A1 1/2016 Spanos et al.
2016/0078219 A1 3/2016 Hernan
2016/0080156 A1 3/2016 Kaliski, Jr.
2016/0086187 A1 3/2016 Joao
2016/0092988 A1 3/2016 Letourneau
2016/0112200 A1 4/2016 Kheterpal et al.
2016/0125040 A1 5/2016 Kheterpal et al.
2016/0162873 A1 6/2016 Zhou et al.
2016/0203448 A1 7/2016 Metnick et al.
2017/0005804 A1 1/2017 Zinder
2017/0017955 A1 1/2017 Stern et al.
2017/0091750 A1 3/2017 Maim
2017/0124535 A1 5/2017 Juels et al.
2017/0132630 A1 5/2017 Castinado et al.
2017/0154331 A1 6/2017 Voorhees
2017/0236196 A1* 8/2017 Isaacson ................ G06Q 20/12
705/14.51
2017/0293898 A1* 10/2017 Rampton ............. G06Q 20/382
2017/0345011 A1* 11/2017 Salami ................... G06Q 20/42
2017/0352031 A1 12/2017 Collin
2018/0025455 A1 1/2018 Wilson et al.
2018/0068359 A1 3/2018 Preston et al.
2018/0089758 A1 3/2018 Stradling et al.
2018/0089759 A1 3/2018 Stradling et al.
2018/0089760 A1 3/2018 Stradling et al.
2018/0089761 A1 3/2018 Stradling et al.
2018/0091316 A1* 3/2018 Stradling .............. H04L 9/3297
2018/0101906 A1* 4/2018 McDonald ........... G06Q 20/204
2018/0121918 A1 5/2018 Higgins
2018/0191503 A1 7/2018 Alwar et al.
2018/0204192 A1 7/2018 Whaley et al.
2018/0218176 A1 8/2018 Voorhees et al.
2018/0225660 A1 8/2018 Chapman et al.
2018/0367298 A1 12/2018 Wright et al.
2019/0043048 A1 2/2019 Wright et al.

(56) References Cited

U.S. PATENT DOCUMENTS

| | | | |
|---|---|---|---|
| 2019/0050541 | A1 | 2/2019 | Wright et al. |
| 2019/0050832 | A1 | 2/2019 | Wright et al. |
| 2019/0052454 | A1 | 2/2019 | Wright et al. |
| 2019/0052458 | A1 | 2/2019 | Wright et al. |
| 2019/0057211 | A1 | 2/2019 | Wright et al. |
| 2019/0057362 | A1 | 2/2019 | Wright et al. |
| 2019/0057382 | A1 | 2/2019 | Wright et al. |
| 2019/0058592 | A1 | 2/2019 | Wright et al. |
| 2019/0058600 | A1 | 2/2019 | Wright et al. |
| 2019/0058733 | A1 | 2/2019 | Wright |
| 2019/0066065 | A1 | 2/2019 | Wright et al. |
| 2019/0066228 | A1 | 2/2019 | Wright |
| 2019/0068365 | A1 | 2/2019 | Wright et al. |
| 2019/0073646 | A1 | 3/2019 | Wright et al. |
| 2019/0095880 | A1 | 3/2019 | Glover et al. |
| 2019/0095909 | A1 | 3/2019 | Wright et al. |
| 2019/0102758 | A1 | 4/2019 | Wright et al. |
| 2019/0108232 | A1 | 4/2019 | Calcaterra et al. |
| 2019/0114706 | A1 | 4/2019 | Bell et al. |
| 2019/0116024 | A1 | 4/2019 | Wright et al. |
| 2019/0130391 | A1 | 5/2019 | Wright et al. |
| 2019/0130399 | A1 | 5/2019 | Wright et al. |
| 2019/0180273 | A1 | 6/2019 | Cummings et al. |
| 2019/0220836 | A1 | 7/2019 | Caldwell |
| 2019/0236564 | A1 | 8/2019 | Cantrell et al. |
| 2019/0273725 | A1 | 9/2019 | Allen |
| 2019/0340607 | A1 | 11/2019 | Lynn et al. |
| 2020/0143367 | A1 | 5/2020 | LeBeau et al. |
| 2020/0167769 | A1 | 5/2020 | Green |
| 2020/0273048 | A1 | 8/2020 | Andon et al. |
| 2020/0274389 | A1 | 8/2020 | Islam et al. |
| 2020/0327609 | A1 | 10/2020 | Dubrofsky |
| 2020/0380476 | A1 | 12/2020 | Trudeau et al. |
| 2021/0176075 | A1 | 6/2021 | Chu et al. |
| 2021/0182272 | A1 | 6/2021 | Shpurov et al. |
| 2021/0184841 | A1 | 6/2021 | Shpurov et al. |
| 2021/0184843 | A1 | 6/2021 | Shpurov et al. |
| 2021/0184850 | A1 | 6/2021 | Shpurov et al. |
| 2021/0357489 | A1 | 11/2021 | Tali et al. |
| 2021/0357914 | A1 | 11/2021 | Silvestri et al. |
| 2022/0122062 | A1 | 4/2022 | Mayblum et al. |
| 2022/0253842 | A1 | 8/2022 | James et al. |

FOREIGN PATENT DOCUMENTS

| | | | |
|---|---|---|---|
| EP | 2634738 | A1 | 9/2013 |
| JP | WO2016088659 | | 9/2019 |
| WO | WO0026745 | A2 | 5/2000 |
| WO | WO0167409 | A1 | 9/2001 |
| WO | WO0186373 | A2 | 11/2001 |
| WO | WO2011008630 | A1 | 1/2011 |
| WO | WO2013034278 | A2 | 3/2013 |
| WO | WO2015059669 | | 4/2015 |
| WO | WO2015085393 | | 6/2015 |
| WO | WO2015113519 | | 8/2015 |
| WO | WO2016015041 | A1 | 1/2016 |
| WO | WO2016029119 | | 2/2016 |
| WO | WO2015179020 | | 3/2016 |
| WO | WO2016022864 | | 4/2016 |
| WO | WO2018127923 | | 7/2018 |

OTHER PUBLICATIONS

Office Action for U.S. Appl. No. 17/966,221, mailed on Oct. 5, 2023, Michael So, "Systems, Methods, and Program Products for Loaning Digital Assets and for Depositing, Holding and/or Distributing Collateral as a Token in the Form of Digital Assets on an Underlying Blockchain", 20 pages.

Bob Sullivan, 'Deadbeat bidders' dog eBay sellers, NBCNews.com (published Sept. 5, 2002), http://www.nbcnews.com/id/3078738/ns/technology_and_sciencetech_and_gadgets/t/deadbeat-bidders-dog-ebay-sellers/#.U4inz_IdXuS (last visted May 30, 2014).

"What is Blockchain Technology?" Quora. N.p. Jan. 15, 2009. Web. Jun. 9, 2017. <https://www.quora.com/What-is-)lockchain-technology-1 >. (Year: 2009).

2-of-3 Paper Wallets, Bitcoin Forum (published Jan. 29, 2013), https://bitcointalk.org/index.php?topic=139625. msg1487254 (last visited Dec. 4, 2013).

A block chain based decentralized exchange, harsh Patel.

A Physical Price Tag For a Digital Currency. Introducing Bittag., BitTag, http://bittag.net/ (last visited Feb. 5, 2014).

A powerful trading platform for Bitcoin traders, BTXTrader.com (Aug. 13, 2013) Internet Archive, https://web.archive.org/web/20130813052513/http:www.btxtrader.com/.

About Bitcoin, Bitcoin.org (May 2, 2013) Internet Archive, http://web.archive.org/web/20130502214154/http://bitcoin.org/en/about.

Sanjay Panikkar et al., Adept: An loT Practitioner Perspective, IBM (2015).

All About Bitcoin, Goldman Sachs, Global Macro Research, Top of Mind, Issue 21 (Mar. 11, 2014).

"AlphaPoint Announces Blockchain Solution Custom-Built for Financial Institututions," AlphaPoint, https://globenewswire.com/news-release/2015/10/26/779929/0/en/AlphaPoint-Announces-blockchain-solution-custom-built-for-financial-institutions.html, Oct. 26, 2015, 3 pages.

"Digital Currency Exhange Goes Live to Publin in Melbourne, Australia," AlphaPoint, https://globenewswire.com/news-release/2015/12/10/794524/0/en/Digital-Currency-Exchange-Goes-Live-to-Public-in-Melbourne-Australia.html, Dec. 10, 2015, 3 pages.

An Open Source P2P Digital Currency, Bitcoin.org, http://bitcoin.org/en/ (last visited Jul. 22, 2013).

Ashlee Vance & Brad Stone, The Bitcoin-Mining Arms Race Heats Up, BloombergBusinessweek, http://www.businessweek.com/articles/2014-01-09/bitcoin-minig-chips-gear-computing-groups-competition-heats-up (last visited Jan. 9, 2014).

Jon Southurst, ATM Industry Association Publishes Report on Bitcoin ATMs, CoinDesk (Published Mar. 20, 2014), http://www.coindesk.com/atm-industry-association-publishes-report-bitcoin-atms/ (last visited Mar. 21, 2014).

ATMIA ATM Industry Association Position Paper, www.atmia.com , Internet.

BANKEX Proof-of-Asset Protocol—The Smart White Paper, version 0.3.1 beta (Oct. 19, 2017) 36 pgs.

Durnford, Barter netwrok aims to help Mile End's cash-strapped live well, The Gazette [Montreal, Que] (Jan. 23, 1996).

Nick Szabo, Bit gold, unenumerated.blogspot.com (Mar. 29, 2006) Internet Archive, https://web.archive.org/web/20060329122942/http://unenumerated.blogspot.com/2005/12/bit-gold.html.

David Andolfatto, Bitcoin and Beyond: The Possibilities and Pitfalls of Virtual Currencies, Federal Reserve Bank of St. Louis, Dialouge with the Fed, Beyond Today's Financial headlines (Mar. 31, 2014).

Joe Adler, Bitcoin Backers Seek FDIC-Style Insurance, American Banker (Jan. 22, 2014), http://www.americanbanker.com/issues/179_15/bitcoin-backers-seek-fdic-style-insurance-1065089-1.html?zkPrintable=true.

Stephen Foley & Alice Ross, Bitcoin bubble grows and grows, Financial Times, http://www.ft.com/intl/cms/s/0/b4be7d8e-9c73-11e2-9a4b-00144feabdc0/html (last visited Oct. 30, 2013).

Bitcoin Fund Exclusively Available on Exante's Platform, Exante, https://exante.eu/press/news/266/ (last visited Oct. 10, 2013).

Bitcoin Moves Closer to Regulation, Stratfor Flobal Intelligence (Jan. 29, 2015), https://www.stratfor.com/sample/analysis/bitcoin-moves-closer-regulation#axzz/ (last visited Jan. 30, 2015).

Bitcoin Now on Bloomberg, Bloomberg Now (Apr. 30, 2014) Internet Archive, https://web.archive.org/web/20140430184511/http://www.bloomberg.com/now/2014-04-30/bitcoin-now-bloomberg/.

Bitcoin Theft Insurance, Ecoin Club (published Dec. 3, 2013), http://ecoinclub.com/bitcoin-insurance/ (Last visited Dec. 5, 2013).

Bitcoin's First Kiosk, Robocoin (Jul. 2, 2013) Internet Archive, https://web.archive.org/web/20130702171110/https://robocoinkiosk.com/.

Bitcoin's First Real ATM, Robocoin Blog, http://blog.robocoinkiosk.com/ (last visited Nov. 11, 2013).

(56) References Cited

OTHER PUBLICATIONS

Bitcoin, Wikipedia (Jun. 24, 2013), Internet Archieve http://web.archieve.org/web/20130624030646/http://en.wikipedia.org/wiki/Bitcoin.
Bitcoin: a first assessment, FX and Rates | Global, Bank of America Merrill Lynch (Dec. 5, 2013).
Nakamoto, S., "Bitcoin: A Peer-to-Peer Electronic Cash System," www.bitcoin.org, 9 pages.
Francois R. Velde, Bitcoin: A primer, The Federal Reserve Bank of Chicago, Chicago Fed Letter (Dec. 2013).
John Heggestuen, Bitcoin: How it Works, and How it Could Fundamentally Change How Companies and Individuals Handle Payments, BI Intelligence (Jan. 30, 2014).
Bitcoin: Intrinsic Value as Conduit for Disruptive Payment Network Technology, Wedbush, Computer Services: Financial Technology (Dec. 1, 2014).
Bitcoin: Questions, Answers, and Analysis of Legal Issues, Congressional Research Service (Dec. 20, 2013).
Anton Badev and Matthew Chen, Bitcoin: Technical Background and Data Analysis, Finance and Economics Discussion Series, Divisions of Research & Statistics and Monetary Affairs, Federal Reserve Board, Washington, D.C. (Oct. 7, 2014).
Julieta Duek and Demian Brener, Bitcoin: Understanding and Assesing potential Opportunities, Quasar Ventures (Jan. 2014).
Bitcoin: Watch the Innovation, Not the Price, Wedbush, Computer Services: Financial Technology (Feb. 14, 2014).
BitcoinAverage.com—independent bitcoin price, Bitcoin Forum, https://bitcointalk.org/index.php?topic=270190.0 (last visited Feb. 24, 2014).
BitcoinAverage.com, Reddit, http://www.reddit.com/r/rBitcoin/comments/1j19c2/ (last visited Feb. 24, 2014).
Bitcoinaverage code respository, GitHub, https://github.com/bitcoinaverage/bitcoinaverage/commits/master?page=134 (last visited Feb. 24, 2014).
Bitcoins and Banks: Problematic currency, interesting paymetn system, UBS, Global research (Mar. 28, 2014).
Bitcoins the hard way: Using the raw Bitcoin protocol, Ken Shirriff's blog, (Feb. 3, 2014) Internet Archive, https://web.archive.org/web/20140203192446/http://www.righto.com/2014/02/bitcoins-hard-way-using-raw-bitcoin.html.
Bitflash Weekly Review (Apr. 14, 2014), Pantera, https://panteracapital.com/bitflash/ (last visited Apr. 15, 2014).
"Blockchain Technologies Corp Makes History, 2016 lowa Caucus Results Forever Documented on Blockchain", https://globenewswire.com/news-release/2016/02/06/808320/1059855/en/Blockchain-technologies-corp-makes-history-2016-iowa-caucus-results-forever-documented-on-blockchain.html, Feb. 5, 2016, 2 pages.
Blocktrail | Bitcoin Block, Explorer, Blocktrail (Aug. 18, 2014), https://www.blocktrail.com/.
BTC, Google Finance, https://www.google.com/finance?q=CURRENCY%3ABTC&ei=T-euU7jVFZOUwQPNklHYCQ (last visited Jul. 11, 2014).
Burnable Token, OpenZeppelin.org (accessed Jun. 18, 2018) https://openseppelin.org/api/docs/tokenERC20BurnableToken.html, 2 pages.
Buying and Selling Linden Dollars, Second Life, http://community.secondlife.com/t5/English-Knowledge-Base/Buying-and-selling-Linden-dollars/ta-p/700107 (last visited Dec. 9, 2013).
Charts, Bitcoin Charts (May 10, 2013) Internet Archive, https://web.archive.org/web/20130510172057/http://bitcoincharts.com/charts.
Choose Your Wallet, Bitcoin.org (May 30, 2013) Internet ARchieve, http://web.archive.org/web/20130530072551/http://bitcoin.org/en/choose-your-wallet.
Circle (May 19, 2014) Internet Archive, https://web.archive.org/web/20140519175717/https://www.circle.com/.
Jonathan Shieber, Circle Emerges From Stealth to Bring Bitcoin to the Masses, TechCrunch (May 18, 2014) Internet Archive, https://web.archive.org/web/20140518130248/http://techcrunch.com/2014/05/15/circle-emerges-from-stealth-to-bring-bitcoin-to-the-masses/.
Coinbase Custody—coinbase.com (retrieved Jul. 9, 2018) https://custody.coinbase.com/ , 3 pages.
Coinbase Custody is Officially Open for Business, the Coinbase Blog, Sam McIngvale (July 2) https://blog.coinbase.com/coinbase-custody-is-officially-open-for-business-182c297d65d9, 4 pages.
Coinbase, Bitcoin Wallet, https://coinbase.com/ (last visited Aug. 15, 2013).
Coinbase, Bitcoin Wallet, Bitcoin made simple, https://coinbase.com/ (last visited Aug. 15, 2013).
Jon Matonis, CoinDesk Launches Proprietary Bitcoin Price Index, CoinDesk (published Sep. 11, 2013), http://www.coindesk.com/coindesk-launches-proprietary-bitcoin-price-index/ (last visited Oct. 30, 2013).
Coindesk, Bitcoin Price Index, http://www.coindesk.com/price/ (last visited Oct. 28, 2013).
Coindesk, This week we released the first version of our mobile app on iPhone, Twitter (published May 2, 2014), https://twitter.com/coindesk/status/462255287177453568?refsrc=email (last visited May 5, 2014).
Daniel Palmer, Coinfloor Plans Europe's First Bitcoin ETF, Adds USD Support, CoinDesk (Oct. 21, 2014), http://www.coindesk.com/coinfloor-launch-bitcoin-trading-fund-adds-new-currencies/ (last visited Oct. 22, 2014).
Coinsetter Launches Out of Beta, Platform Now a Full U.S. Bitcoin Exchange, Coinsetter blog (Jul. 24, 2014), http://www.coinsetter.com/blog/2014/07/24/coinsetter-launches-beta-platform-now-full-US-bitcoin-exchange/ (last visited Jul. 24, 2014).
Compound: The Money Market Protocol—Version 0.2 (Feb. 2018) Robert Leshner, Geoffrey Hayes, 10 pgs., https:compound.finance, Internet.
GitHub—ConsenSys/MultiSigWallet—Ethereum MultiSigWallet (Accessed Jun. 21, 2018) 1 pg., 3. https://github.com/ConsenSys/MultiSigWallet , Internet.
Cosmos, A Network Distributed Ledgers, Jae Kwon and Ethan Buchman, https://cosmos.network/resources/whitepaper, (accessed May 29, 2018) Whitepaper—Resources—Cosmos Network, Internet.
Daniel Roberts, On Winklevoss Bitcoin index, it's open season for developers, Fortune, (Jul. 22, 2014).
Digitizing Trust: Leveraging the Bitcoin Protocol Beyond the "Coin", Wedbush, Computer Services: Financial Technology (Jan. 2, 2014).
Ina Steiner, eBay Mulls New Feature to Eliminate Deadbeat Bidders, EcommerceBytes Blog (published May 12, 2012) http://www.ecommercebytes.com/C/blog.pl?/pl/2012/5/1336831866.html (last visited May 30, 2014).
Electrum, Bitcoin wiki, https://en.bitcoin.it/wiki/Electrum (last visited Jul. 22, 2013).
Elliptic Vault: Secure, Worry-free Storage for Your Bitcoins, Elliptic.co (Jan. 12, 2014) Internet Archive, https://web.archive.org/web/20140112043128/https://www.elliptic.co/vault.
Daniel Cawrey, Eschewing Price, Pantera Launches BitIndex to Track Bitcoin, CoinDesk (Jul. 10, 2014), http://www.coindesk.com/eschewing-price-pantera-launches-bitindex-track-bitcoin/ (last visited Jul. 11, 2014).
Dapp-bin/wallet.sol at master—ethereum/dapp-bin—GitHub (retrieved Jun. 21, 2018) https:github.com/ethereum/dapp-bin/blob/master/wallet/wallet.sol, 7 pages.
David Harper, Exploring the Exponentially Weighted Moving Average, Investopedia (Mar. 18, 2007) Internet Archive, https://web.archive.org/web/20070318160651/http://www.investopedia.com/articles/07/EWMA.asp.
FAQ: What's the Difference Between PPCoin and Bitcoin?, GitHub, https://github.com/ppcoin,ppcoin/wiki/FAQ (last visited Jul. 22, 2013).
Ferrara, "Token Burning' and Other Crypto Jargon Simplified", Nov. 2017, 4 pgs.
First Bitcoin Capital Corp.(otc markets:BITCF) Launches Digital Currency Exchange, CoinQX.com in Beta, The Wall Street Journal MarketWatch, http://www.marketwatch.com/stroy/first-bitcoin-capital-corpotc-markets-bitcf-launches- digital-currency-exchange-coinqxcom-in-beta-2014-05-21 (last visited May 21, 2014).

(56) References Cited

OTHER PUBLICATIONS

Mike Calvanese, Flexible Upgradability for Smart Contracts—Level K—Medium (Mar. 10) 15 pgs., https://medium.com/level-k/flexible-upgradibility-for-smart-contracts-9778d80d1638.
Fundamentals, FAQ (Accessed Jun. 26, 2018) 10 pgs. https://faq.rsk.com/en/main/ , INternet.
GutHub—gnosis/MultiSigWallet: allows multiple parties to agree on transactions before execution, (Accessed Jun. 21, 2018) 3 pgs., https://github.com/Gnosis/MultiSigWallet , Internet.
Goldman Sachs Group, Goldman Sachs files patent for virtual settlement currency, Financial Times, https://www.ft.com/contentb0d8f614-997c-11e5-9228-87e603d47bdc (last visited Oct. 3, 2018).
Home—OmniLayer/omnicore Wiki—GitHub—Welcome to the Omni Core wiki! (Accessed Jun. 26, 2018) 1 pg., https://github.com/OmniLayer/omnicore/wiki , Internet.
How Bitcoin is Driving Digital Innovation in Entertainment, Mediaand Communications (EMC), PwC Consumer Intelligence Series, Digital Disruptor, (Jan. 27, 2014).
How Bitcoin Works Under the Hood, Imponderable Things (Scott Driscoll's Blog) (published Jul. 14, 2013), http://www.imponderablethings.com/2013/07/how-bitcoin-works-under-hood.html (last visited Oct. 10, 2013).
How DigiCash Blew Everything, Next (published Jan. 1999), http://cryptome.org/jya/digicrash.htm (last visited Jan. 9, 2014).
How Does Bitcoin Work? , Bitcoin.org, (May 1, 2013) Internet Archive, http://web.archive.org/web/20130501092121/http://bitcoin.org/en/how-it-works.
How is Mt. Gox weighted average calculated?, Bitcoin Forum (Mar. 18, 2013), https://bitcointalk.org/index.php? topic=154548.0 (last visted Jul. 25, 2013).
Co/MintableToken.sol at master—TokenMarketNet/ico—GitHub (Accessed Jun. 21, 2018), 2 pgs., https://github.com/TokenMarketNet/ico/blob/master/contracts/MintableToken.sol , internet.
Co/UpgradeableToken.sol at master—TokenMarketNet/ico—GitHub (Accessed Jun. 8, 2018 3 pgs., https://github.com/TokenMarketNet/ico/blob/master/contracts/UpgradeableToken.sol , Internet.
Independent Bitcoin Price, BitcoinAverage, https://bitcoinaverage.com/explain.htm (last visited Mar. 4, 2014).
Interledger Architecture | Interledger (Accessed May 29, 2018), 11 pgs. https://interledger.org/rfcs/0001-interledger-architecture/draft-2.html, Internet.
International Search Report and Written Opinion issued in Application No. PCT/US16/040711 dated Oct. 4, 2016 (14 pages).
Introducing BDIC: Bitcoin's decentralized, privately-funded version of the FDIC, Reddit (Published Dec. 4, 2013), http://www.reddit.com/r/Bitcoin/comments/1s365o/introducing_bdic_bitcoins_decentralized/ (last visited Dec. 5, 2013).
Introducing Compound, the Money Market Protocol, Robert Leshner, medium.com (Jan. 30, 2018) https://medium.com/compound-finance/introducing-compound-the-money-market-protocol-4b9546bac87 , Internet.
Trusttoken, Introducing Crunchbase Pro, https://www.crunchbase.com/organization/trusttoken#section-overview, accessed Apr. 16, 2018, 1 pg., TrustToken | Crunchbase, Internet.
Jerry Brito, et al., Bitcoin, A Primer for Policymakers (2013).
JP Morgan Has Big Plans for Blockchain by Rakesh Sharma, May 10, 2018, Investopedia, 6 pgs., https://www.investopedia.com/news/jpmorgan-has-big-plans-blockchain/ , Internet.
The audacity of bitcoin, Risks and opportunites for corporates and investors, Global rates & FX Research, J.P. Morgan (Feb. 11, 2014), http://www.jpmorganmarkets.com/GlobalFXStrategy.
Brian Cohen, JPMorgan Chase Building Bitcoin-Killer, Lets Talk Bitcoin (published Dec. 9, 2013) http://letstalkbitcoin.com/jpmorgan-chase-building-bitcoin-killer/ (last visited Dec. 10, 2013).
JPMorgan Trial Puts Debt Issuance on a Blockchain, Sujha Sundararajan, CoinDesk, (Apr. 10, 2018) 8 pgs., https://www.coindesk.com/jpmorgan-trial-puts-debt-issuance-on-a-blockchain/ , INternet.
Ken Hawkins, Exchange-Traded Funds (EFTs), Investopedia (May 12, 2013) Internet Archive, https://web.archive.org/web/20130512125447/http://www.investopedia.com/university/exhnage-traded-fund/.
Leviar—An Anonymous, Secure, and Private Cryptocurency, Leviar Coin 16 pages.
Leviarcoin, "LeviarCoin Announces Crowdsale for Its Revolutionary Blockchain-Based In-App Purchases and Software Protection Platform" https://leviarcoin.org , published Jun. 2, 2017.
Lisa Fleisher, London's New Bitcoin Exchange Hopes to Avoid Mt. Gox Fate, The Wall Street Journal (published Apr. 30, 2014), http://blogs.wsj.com/digits/2014/04/30/londs-new-bitcoin-exchange-hopes-to-avoid-mt-gox-fate/ (last visited May 1, 2014).
[ANN] M-of-N "Fragmented Backups" now in Aromory (command-line only), Bitcoin Forum (Mar. 6, 2013), https://bitcointalk.org/index.php?topic=149820.0 (last visited Dec. 4, 2013).
Major Bitcoin Investment Firm Launches Bitindex, The Crypto Crimson, (published Jul. 10, 2014), http://cryptocrimson.com/2014/07/major-bitcoin-investment-firm-launches-bitindex/ (last visited Jul. 11, 2014).
Marketplace—Gemini, web.archive.org (Last modified Jan. 8, 2018) http://web.archive.org/web/20180125115941/https://gemini.com/marketplace/ , Internet.
Marketplace—Gemini, web.archive.org (Last modified Novemeber 25, 2017) http:web.archive.org/web/20171211092415/https://gemini.com/marketplace/ , Internet.
Marketplace, gemini.com (Last modified Sep. 20, 2018) https://gemini.com/marketplace/ , Internet.
Markets API, Bitcoin Charts (Jun. 3, 2013) INternet Archive, https://web.archive.org/web/20130603091557/http://bitcoincharts.com/about/markets-api.
Max Raskin, Cameron and Tyler Winklevoss on Bitcoin and Their Public Persona, BloombergBusinessweek, http://www.businessweek.com/articles/2013-08-08/cameron-and-tyler-winklevoss-on-bitcoin-and-their-public-persona (last visited Aug. 8, 2013).
James Ball, Meet the seven people who hold the keys to worldwide internet security, The Guardian, http://www.theguardian.com/technology/2014/feb/28/seven-people-keys-worldwide-internet-security-web (last visited Mar. 7, 2014).
MintableToken contract MintableToken is StandardToken—OpenZeppelin 1.8.0, OpenZeppelin.org (Accessed Jun. 18, 2018) 3 pgs., https://openseppelin.org/api/docs/token_ERC20_MintableToken.html , Internet.
GitHub—BitGo/eth-multisig-v2: Multi-Sig Wallet v2, supporting original Wallet.sol methods with additional confirmAndExecute improvements to allow for single-transaction signing by multiple owners (retrieved Jun. 21, 2018) https://github.com/BitGo/eth-multisig-v2 , 2 pages.
"Nasdaq Launches Enterprise-Wide Blockchain Technology Initiative", Nasdaq, https://globenewswire.com/news-release/2015/05/11/734456/10133665/en/nasdaq-launches-enterprise-wide-blockchain-technology-initiative.html, May 11, 2015, 3 pages.
Nasdaq Linq Enables First-Ever Private Securites Issuance Documented with Blockchain Technology, Nasdaq, https://globenewswire.com/news-release/2015/12/20/798660/0/en/Nasdaq-Linq-enables-first-ever-private-securities-issuance-documented-with-blockchain-technology.html, Dec. 30, 2015, 3 pages.
New batchOverflow Bug in Multiple ERC20 Smart Contracts (CVE-2018-10299) A Blockchain Security Company—Pecksheild (Apr. 22, 2018) medium.com/@pecksheild/alert-new-batchoverflow-bug-in-multiple-erc20-smart-contracts-cve-2018-10299-511067db6536 , Internet.
Notice of References Cited, U.S. Appl. No. 12/192,809 (Oct. 10, 2012).
NYC Bitcoin Exchange Coinsetter Launches Out of Beta With Institutional and Consumer Trading, MarketWatch (published Jul. 24, 2014), http://www.marketwatch.com/stroy/nyc-bitcoin-exchange-coinsetter-launches-out-of-beta-with-institutional-and-consumer-trading-2014-07-24 (last visited Jul. 24, 2014).
Office Action for U.S. Appl. No. 17/248,592, mailed on Mar. 17, 2023, Cameron Winklevoss, "Systems for Purchasing Shares in an Entity Holding Digital Math-Based Assets", 11 pages.

(56) References Cited

OTHER PUBLICATIONS

Office Action for U.S. Appl. No. 17/446,371, mailed on Apr. 3, 2023, "Systems, Methods, and Program Products for Loaning Digital Assets and for Depositing, Holding and/or Distributing Collateral as a Token in the Form of Digital Assets on an Underlying Blockchain", 15 pages.
Office Action for U.S. Appl. No. 17/238,500, mailed on Oct. 12, 2022, Winklevoss, "Systems, Methods, and Program Products for a Digital Math-Based Asset Exchange" 9 pages.
Office Action for U.S. Appl. No. 17/201,223, mailed on Oct. 6, 2022, Winklevoss, "Systems for Redeeming Shares in an Entity Holding Digital Math-Based Assets", 9 pages.
Office Action for U.S. Appl. No. 17/446,371, mailed on Nov. 1, 2022, So, "Systems, Methods, and Program Products for Loaning Digital Assets and for Depositing, Holding and/or Distributing Collateral as a Token in the Form of Digital Assets on an Underlying Blockchain", 12 pges.
Office Action for U.S. Appl. No. 17/201,223, mailed on Feb. 15, 2023, Winklevoss, "Systems for Redeeming Shares in an Entity Holding Digital Math-Based Assets", 9 pages.
Office Action for U.S. Appl. No. 16/911,121, mailed on Mar. 2, 2023, Auerbach, "Systems, Methods, and Program Products for Exchanging Digital Assets for Fiat and/or Other Digital Assets", 19 Pages.
Office Action for U.S. Appl. No. 17/248,592, mailed on May 11, 2022, Winklevoss, "Systems for Purchasing Shares in an Entity Holding Digital Math-Based Assets", 11 pages.
Office Action for U.S. Appl. No. 17/201,223, mailed on May 26, 2022, Winklevoss, "Systems for Redeeming Shares in an Entity Holding Digital Math-Based Assets", 7 pages.
Office Action for U.S. Appl. No. 17/966,221, mailed on Jun. 21, 2023, Inventor #1 Michael So, "Systems, Methods, and Program Products for Loaning Digital Assets and for Depositing, Holding and/or Distributing Collateral as a Token in the Form of Digital Assets on an Underlying Blockchain," 16 pages.
Office Action for U.S. Appl. No. 16/911,121, mailed on Sep. 21, 2022, Auerbach, "Systems, Methods, and Program Products for Exchanging Digital Assets for Fiat and/or Other Digital Assets", 14 Pages.
Online auctions: An in-depth look, National Consumers League, http://www.nclnet.org/personal-finance/121-online-auctions/279online-auctions-an-in-depth-look (last visted May 30, 2014).
Openzeppelin-solidity/BurnableToken.sol at master—OpenZeppelin/openzeppelin-solidity—GitHub, Internet, https://github.com/OpenZeppelin/openzeppelin-solidity/blob/master/contracts/token/ERC20/BurnableToken.sol , 1 pg, accessed Jun. 18, 2018.
OpenZeppelin/openzeppelin-solidity (Accessed Jun. 21, 2018) 3 pgs., https://github.com/OpenZeppelin/openzeppelin-solidity/blob/master/contracts/token/ERC20/StandardToken.sol , Internet.
Polkadot paper, Dr. Gavin Wood, Version: 1 (Sep. 20, 2017).
PPcoin, Wikipedia, http://en.wikpedia.org/wiki/PPCoin (last visited Jul. 22, 2013).
Sunny King & Scott Nadal, PPCoin: Peer-to-Peer Crypto-Currency with Proof-of-Stake, (Aug. 19, 2012).
Private Bitcoin Insurance, Inscrypto, http://go.inscrypto.com (last visited Jan. 24, 2014).
Proof of stake instead of proof of work, Bitcoin Forum, https://bitcointalk.org/index.php?topic=27787 (last visited Nov. 6, 2015).
Larry Ren, Proof of Stake Velocity: Building the Social Currency of the Digital Age, www.redcoin.com (Apr. 2014).
Proof-of-stake, Wikipedia, http://en.wikipedia.org/wiki/Proof-of-stake (last visited Jul. 22, 2013).
Proof-of-work System, Wikipedia, http://en.wikipedia.org/wiki/Proof-of-work (last visited Jul. 22, 2013).
Protocol of Bitcoin, Wikipedia, http://en.wikipedia.org/wiki/Bitcoin_mining (last visited Jul. 22, 2013).
Rachel Abrams, Winklevoss Twins to List Bitcoin Fund on Nasdaq, The New York Times DealB%k, http://dealbook.nytimes.com/2014/05/08/winklevoss-twins-to-list-bitcoin-fund-on-nasdaq/ (last visited May 8, 2014).
Rafael Cosman, https://www.facebook.com/rafaelCosman, Internet, accessed Apr. 16, 2018, 14 pgs., Facebook, Internet.
Rafael Cosman, RafaelCosman (Rafael Cosman)· GitHub, https://github.com/RafaelCosman, accessed Apr. 16, 2018, 1 pg., Internet.
Rafael Cosman, RafaelCosman (Rafael Cosman) | Repositories · GitHub, https://github.com/RafaelCosman?page=2&tab=repositories, accessed Apr. 16, 2018, 3 pgs., Internet.
Rafael Cosman, Rafael Cosman (@RafaelCosman) | Twitter, https://twitter.com/rafaelcosman?lang=en, accessed Apr. 16, 2018, 23 pgs, Internet.
Evan L. Greebel et al., Recent Key Bitcoin and Virtual Currency Regulatroy and Law Enforecment Developments, Virtual Currency Advisory, Katten Muchin Rosenman LLP (Nov. 13, 2014).
Request for Administrative Ruling on the Application of FinCEN's Regulations to a Virtual Currency Payment System, United States Department of the Treasury, FinCEN, (Oct. 27, 2014). FIN-2014-R011.
Ronald A. Glantz, Pantera Primer, (Mar. 11, 2014).
"RR Donnelley to Pursue New Blockchain-Eneabled Capabilities for Publishing Industry," https://globenewswire.com/news-release/2016/03/14/819355/0/en/pr-donnelley-to-pursue-new-blockchain-enabled-capabilities-for-publishing-industry.html, Mar. 14, 2016, 3 pages.
Secuirty for Your Peace of Mind, Coinbase, https://coinbase.com/security (last visited Oct. 28, 2013).
Securing Your Wallet, Bitcoin.org (Jul. 21, 2013) Internet Archive, http://web.archive.org/web/20130721194621/http://bitcoin.org/en/secure-your-wallet.
Shamir's Secret Sharing, Wikipedia, http://en.wikipedia.org/wiki/Shamir's_Secret_Sharing (last visited Jul. 22, 2013).
Rob Wile, Shares of No-Name Tech Company go Crazy After it Announces It's Getting Into the Bitcoin Game, business Insider, http://www.businessinsider.com/wcps-bitcoin-2013-12?hr_email_referer=1&utm_source=Triggermail&utm_medium=email&utm_content=emailshare (last visited Dec. 30, 2013).
Smart Contract Upgradeability using Eternal Storage (Accessed Jun. 8, 2018) 6 pgs., 3. https://blog.zeppelinos.org/smart-contract-upgradeability-using-eternal-storage/ , Internet.
Some Things You Need to Know, Bitcoin.org (May 2, 2013) Internet Archive, http://web.archive.org/web/20130502051011/http://bitcoin.org/en/you-need-to-know.
State of Bitcoin 2014, CoinDesk (Feb. 26, 2014).
Superbitcoin—Supersmartbitcoin.com (Accessed Jun. 26, 2018) 8 pgs., http://supersmartbitcoin.com/ , Internet.
Tether : Fiat currencies on the Bitcoin blockchain (20 pgs.).
Jeremy Allaire, What We Have Been up to at Circle, the Circle Blog (May 19, 2014) Internet Archive, https://web.archive.org/web/20140519162958/https://www.circle.com/2014/05/15/circle-update/.
The Ripple Network Review—What is Ripple?, Donald Mcintyre—Etherplan (Aug. 1, 2013) https://etherplan.com/2013/08/01/the-ripple-network-what-is-ripple/4103/ , Internet.
The Security Token Thesis—Hacker Noon, Stephen McKeon, https://hackernoon.com/the-security-token-thesis-4c5904761063, (accessed May 29, 2018), Hackernoon.com, Internet.
TigerDirect.com Now Accepts Bitcoin Payments!, TigerDirect, http://www.tigerdirect.com/bitcoin/ (last visited Feb. 6, 2014).
Timing and Sizing the Era of Bitcoin, Wedbush, Computer Services: Financial Technology (May 27, 2014).
Token Standard Extension for Increasing & Decreasing Supply, Alex Miller—ethereum/EIPs—GitHub (retrieved Jun. 21, 2018), https://github.com/ethereum/EIPs/pull/621 , 21 pages.
ERC 644: Token Standard for Modular and Upgradeable Tokens—Issue #644—ethereum/EIPs—GitHub, (opened by chrisfranko—Jun. 16, 2017) https://github.com/ethereum/EIPs/issues/644 , 9 pages.
Trading Namecoins for Bitcoins, Bitcoin Forum, https://bitcointalk.org/index.php?topic=6289.0 (last visited Nov. 6, 2015).
Stephen Kade, TrueUSD: A Stablecoin That You Can Redeem 1-for-1 for US Dollars, https://blog.trusttoken.com/trueusd-a-backed-stablecoin-you-can-trust-9688796cfd0d, Jan. 23, 2018—accessed Apr. 16, 2018, 9 pages., Internet.

(56) References Cited

OTHER PUBLICATIONS

Trustprotocol, Commits· trusttoken/TrustProtocol · GitHub, https://github.com/trusttoken/TrustProtocol/commits/master?after=54f8673366f8dc79cbf4f2aa3e9416bb7c18150d+34, 1 pg_, accessed Apr. 16, 2018, Internet.

Trusttoken, Executive Summary, https://docsend.com/view/ws6tkvs, Feb. 14, 2018 (accessed Apr. 16, 2018) 7 pgs., Version 0.61, TrustToken, Internet.

Trusttoken Team, TrustToken Launches TrueUSD Stablecoin on Bittrex Exchange, https://blog.trusttoken.com/trusttoken-pre-sale-and-main-sale-faq-f7914f74fb6d, Feb. 15, 2018 (accessed Apr. 16, 2018) 5 pgs., TrustToken, Internet.

Teachrecaps, TrustToken Private and Public Pre-Sale FAQ, https://hackemoon.com/trusttoken-launches-trueusd-stablecoin-on-bittrex-exchange-f506ac5cf6fc, Mar. 8, 2018 (accessed Apr. 16, 2018) 4 pgs., TrustToken, Internet.

TrustToken Team: TrueUSD, the world's first legally-backed stable cryptocurrency , is now trading on Bittrex, (pub. Mar. 5, 2018), https://blog.trusttoken.com/trueusd-the-worlds-first-legally-backed-stable-cryptocurrency-is-now-trading-on-bittrex-6a49b621f058 (last visited Apr. 16, 2018).

Trusttoken, Tokenization you can Trust, https://github.com/trusttoken, accessed Apr. 16, 2018, 2 pgs., TrustToken | GitHub, Internet.

U.S. Appl. No. 60/884,172 (filed Jan. 9, 2007).

John McCrank—UK-based Coinfloor to launch physically settled bitcoin futures—Reuters (Accessed Jun. 18, 2018) 2 pgs., https://uk.reuters.com/article/uk-crypto-currencies-coinfloor/uk-based-coinfloor-to-launch-physically-settled-bitcoin-futures-idUKKCHGQ2DF , Internet.

Upgradeable Solidity Contract Design—Rocket Pool—Medium, David Rugendyke (Nov. 21, 2017) 21 pgs., https://medium.com/rocket-pool/upgradeable-solidity-contract-design-54789205276d , Internet.

USD Average Price History, BitcoinAverage, https://bitcoinaverage.com/chart.hmt@USD-averages-all (last visited Feb. 24, 2014).

Using Offline Wallets in Armory, Armory (May 20, 2013) Internet Archive, http://web.archive.org/20130520100213/https://bitcoinarmory.com/using-offline-wallets-in-armory/.

Victoria Turk, Bitcoin 'Banks' Are Trying to Rebrand Cryptocurrencies for the Mainstream, Motherboard, http://motherboard.vice.com/en_ca/read/bitcoin-banks-try-to-rebrand-cryptocurrencies-for-the-mainstream (last visited May 5, 2014).

We make it easy to build secure, high level services on top of the Bitcoin protocol, Trusted Coin (Dec. 26, 2013) Internet Archive, https://web.archive.org/web/20131226232433/https://api.trustedcoin.com/f.

"What is Blockchain Technology?" Quora. N.p. Jan. 15, 2009. Jun. 9, 2017. <https://www.quora.com/What-is-blockchain-technology-1>.

Why Bitcoin is Changing the World, Bitcoin.org (Jun. 20, 2013) Internet Archive, http://web.archive.org/web/20130620062218/http://bitcoin.org/en/innovation.

WINKBTCO Index, Bloomberg Finance L.P. (Jun. 16, 2014).

Winklevoss Bitcoin Trust Amendment No. 3 to Form S-1 Registration Statement, SEC (May 8, 2014), available at http://www.sec.gov/Archives/edgar/data/1579346/000119312514190365/d721187ds1a.htm.

Winklevosses' Gemini to Offer Cryptocurrency Block Trading, Olga Kharis and Matthew Leising, Bloomberg.com (Apr. 9, 2018) https://www.bloomberg.com/news/articles/2018-04-09/winklevoss-s-gemini-to-offter-cryptocurrency-block-trading , Internet.

World Bank taps Australia's CBA for blockchain bond, Reuters (Aug. 9, 2018) https://www.reuters.com/article/us-worldbank-cba-blockchain/world-bank-taps-australias-cba-for-blockchain-bond-idUSKBN1KV02D , Internet.

World Gold Council, How SPDR Gold Shares (2840 HK) are Created and Redeemed (Mar. 2013).

Writing upgradeable ontracts in Solidity—Colony, Elena Dimitrova (Jun. 8, 2016) 18 pgs., https://blog.colony.io/writing-upgradeable-contracts-in-solidity-6743f0eecc88 , Internet.

John Biggs, Xapo Raises $20 Million to Bury Your Bitcoin Underground, TechCrunch (Mar. 14, 2014) Internet Archive, https://web.archive.org/web/20140314042301/http://techcrunch.com/2014/03/13/xapo-raises-20-million-to-bury-your-bitcoin-underground/.

Yacine Ghalim and Max Nieferhofer, bitcoin: Primer, State of Play, Discussion. Courmayeur, Sunstone Capital (Jan. 24, 2014).

An Introduction to Libra—White Paper, Libra Association Members (2019) 12 pages.

Office Action for U.S. Appl. No. 16/911,211, mailed on Jan. 26, 2024, Auerbach, "Systems, Methods, and Program Products for Exchanging Digital Assets for Fiat and/or Other Digital Assets", 19 Pages.

Office Action for U.S. Appl. No. 16/911,121, mailed on Oct. 23, 2023, Auerbach, "Systems, Methods, and Program Products for Exchanging Digital Assets for Fiat and/or Other Digital Assets", 19 Pages.

* cited by examiner

| Transaction Ledger 115 | | | | | | |
| --- | --- | --- | --- | --- | --- | --- |
| Transaction ID | Date | Fee | Origin Identifiers | Amount from Origin | Destination Identifiers | Destination Amount |
| f06dbf23bc69b7fc155f337<br>3aa6e41cdc1c75da613685<br>95c017b13d7b7c15552 | 2014-06-24<br>20:41:32 | 0 | 19Zmw5kMbkTjA7qRUdUEiwLqgRaMRRLDkh<br>19Zmw5kMbkTjA7qRUdUEiwLqgRaMRRLDkh | 500<br>500 | 122BNoyhmuUt9G9mdEm3mN4nb73c1UgNKt | 1000 |
| 9cd9cef3b96936c8c3a1b7c<br>1f6a0de17a3cfcf94c575b7<br>92638bef85c069de58 | 2014-06-24<br>20:41:32 | 0.0001 | 1EvwbspD9jYbH2ZSq6TFbPxftkM8ej5YqP | 45.9983 | 1PXdpLs2k3ETn9vcL4SRp3UiHxHiiMJzXb<br>18S6XTQKH2uUS1GG965Rncn8YmS6jhtkGC | 42.1724747<br>3.8257253 |
| 5f3fb8557633e61e9ab20e<br>b461552e97423c7b3a36b7<br>414e7c672d41efd9c830 | 2014-06-24<br>20:41:32 | 0 | 15u7FXhfiaW7EYWwivZayA9duahXb85Rnv | 303.92706127 | 17ZQyJ7KtgfNhGVWVLc8gdDl6ByyRUqZ8G<br>12eqJZbQpRoYqe6BxGtWq8p8d5UpwZqCek | 154.77363532<br>149.15342595 |
| 535936b199bb3fcbc8d15e<br>e38bb735c6929dd360ea05<br>e27a19514bc4be82d69f | 2014-06-24<br>20:41:32 | 0.00005 | 1JW8RphYjfsnTyV4W62GHpm9QhA2wVPvap | 18.0475292 | 1Bv9zL9SkSWp3pgVDtrVtTNQefFaukXoUk<br>1GnhQNChqguuqgGAtVuijmqxPtk8PZy4EV | 17.2974792<br>0.75 |
| 4616da18de8943f33da984<br>12a6fc8f70c5c0843637d7f<br>b28b9ea9986f31b55ef | 2014-06-24<br>20:41:32 | 0.0001 | 1GD64WARGDLYG71WTTgCpRMpePr1BnmGij | 5 | 1Hrj1qUAer7yUNP8pPxSmhQoifGqW3NfFA<br>1NRNnusa3D4sxxzig5fvwmX1thOnR9w3ZJ<br>1GD64WARGDLYG71WTTgCpRMpePr1BnmGij | 3.45703882<br>0.01388369<br>1.52897749 |

FIG. 2

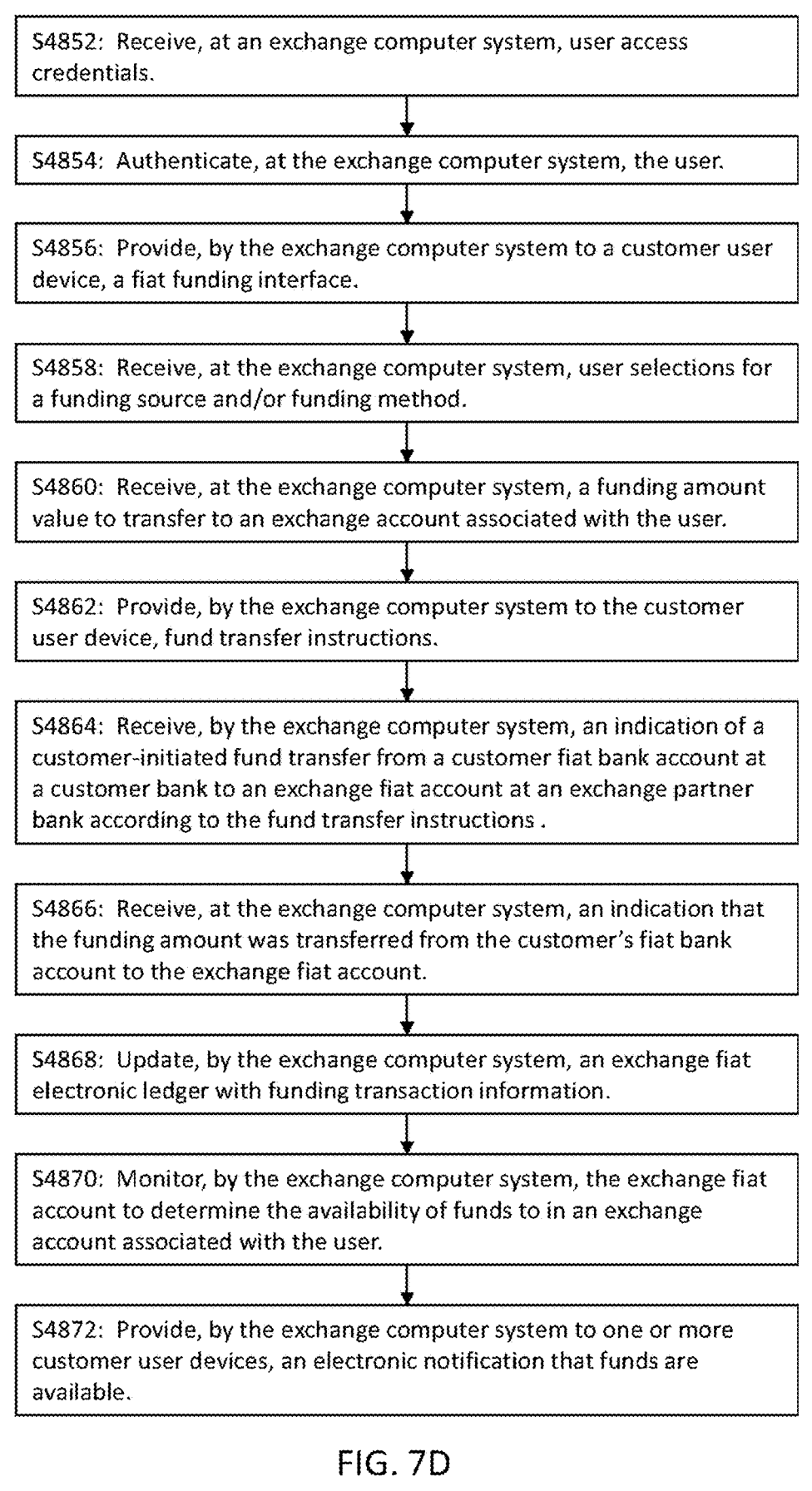

S4852: Receive, at an exchange computer system, user access credentials.

S4854: Authenticate, at the exchange computer system, the user.

S4856: Provide, by the exchange computer system to a customer user device, a fiat funding interface.

S4858: Receive, at the exchange computer system, user selections for a funding source and/or funding method.

S4860: Receive, at the exchange computer system, a funding amount value to transfer to an exchange account associated with the user.

S4862: Provide, by the exchange computer system to the customer user device, fund transfer instructions.

S4864: Receive, by the exchange computer system, an indication of a customer-initiated fund transfer from a customer fiat bank account at a customer bank to an exchange fiat account at an exchange partner bank according to the fund transfer instructions .

S4866: Receive, at the exchange computer system, an indication that the funding amount was transferred from the customer's fiat bank account to the exchange fiat account.

S4868: Update, by the exchange computer system, an exchange fiat electronic ledger with funding transaction information.

S4870: Monitor, by the exchange computer system, the exchange fiat account to determine the availability of funds to in an exchange account associated with the user.

S4872: Provide, by the exchange computer system to one or more customer user devices, an electronic notification that funds are available.

FIG. 7D

DASHBOARD FIAT INTERFACE

DASHBOARD FIAT INTERFACE

DASHBOARD FIAT INTERFACE

DASHBOARD FIAT INTERFACE

DASHBOARD DIGITAL ASSET INTERFACE

DASHBOARD DIGITAL ASSET INTERFACE

DASHBOARD DIGITAL ASSET INTERFACE

DASHBOARD DIGITAL ASSET INTERFACE

DASHBOARD SVCoin INTERFACE

DASHBOARD SVCoin INTERFACE

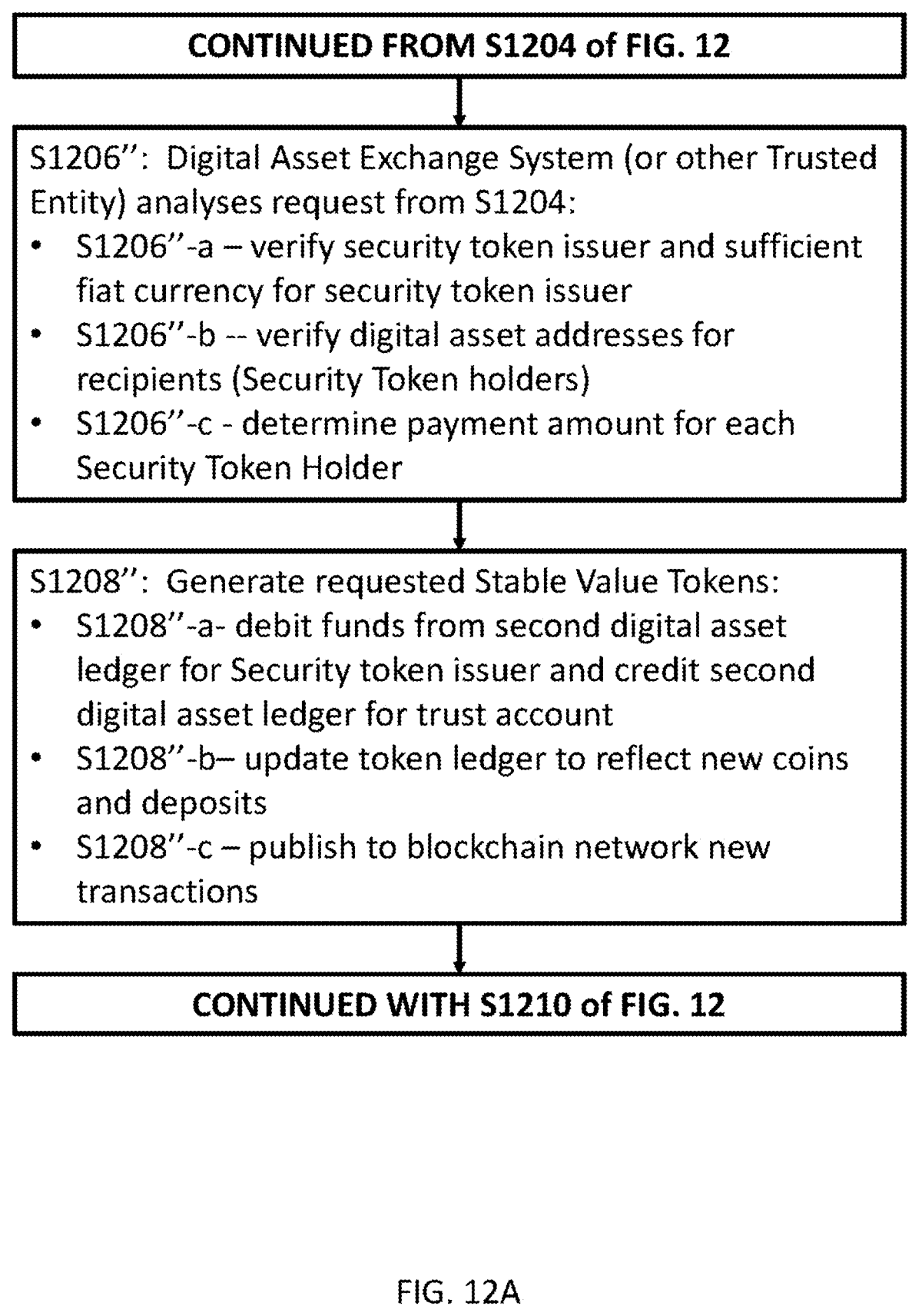

CONTINUED FROM S1204 of FIG. 12

↓

S1206'': Digital Asset Exchange System (or other Trusted Entity) analyses request from S1204:

- S1206''-a – verify security token issuer and sufficient fiat currency for security token issuer
- S1206''-b -- verify digital asset addresses for recipients (Security Token holders)
- S1206''-c - determine payment amount for each Security Token Holder

↓

S1208'': Generate requested Stable Value Tokens:

- S1208''-a- debit funds from second digital asset ledger for Security token issuer and credit second digital asset ledger for trust account
- S1208''-b– update token ledger to reflect new coins and deposits
- S1208''-c – publish to blockchain network new transactions

↓

CONTINUED WITH S1210 of FIG. 12

FIG. 12A

FIG. 15A
Deposit Gemini Dollar
USD (BANK TRANSFER)
USD (WIRE TRANSFER)
GEMINI DOLLAR
BTC
ETH
ZEC
MOST RECENT DEPOSIT ADDRESS
ASSET BALANCES

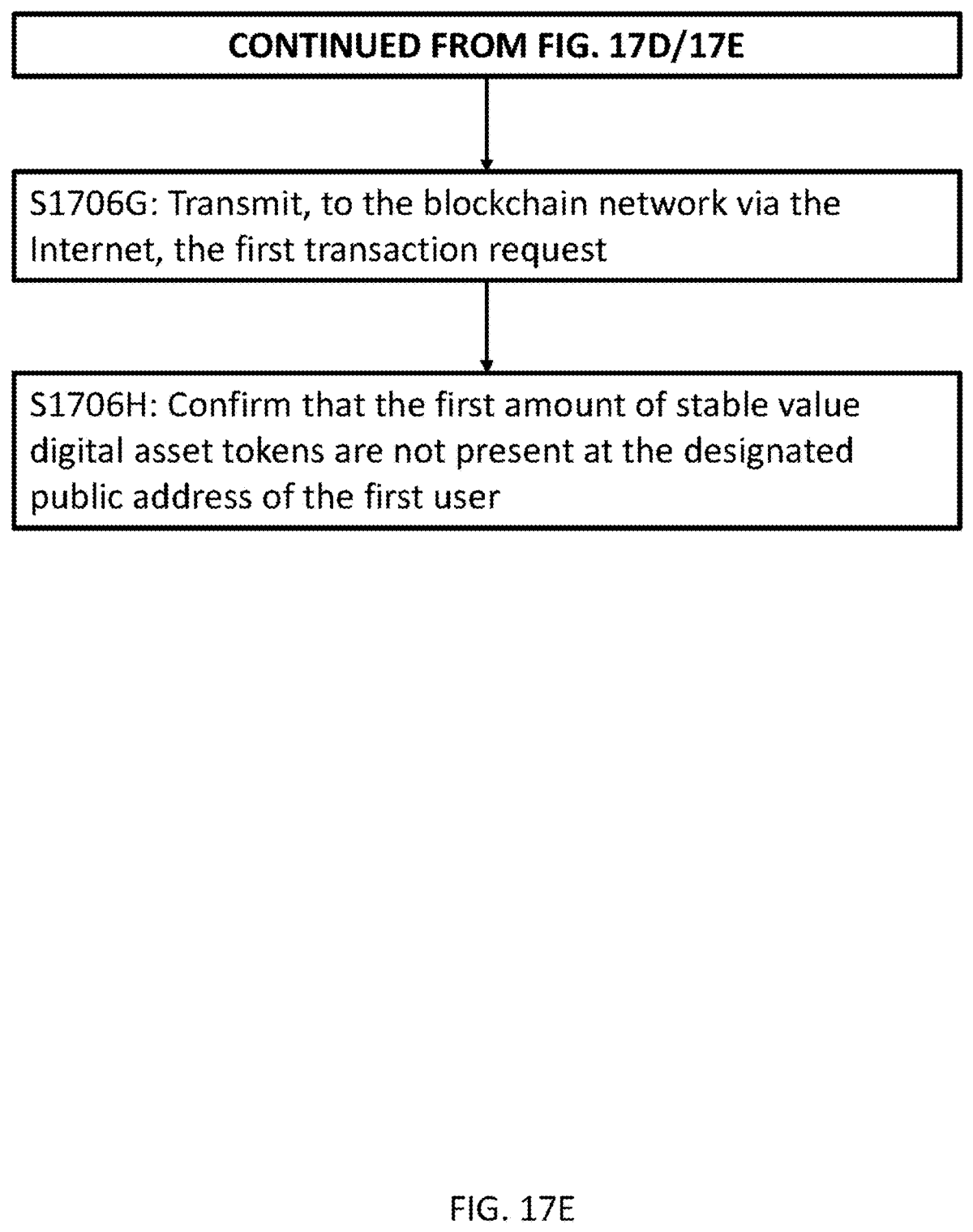

CONTINUED FROM FIG. 17D/17E

S1706G: Transmit, to the blockchain network via the Internet, the first transaction request S1706H: Confirm that the first amount of stable value digital asset tokens are not present at the designated public address of the first user

FIG. 17E

Continued With FIG. 19B

Continued From FIG. 20A

S2012: providing fourth smart contract instructions (e.g. store smart contract instructions) for the digital asset token associated with a fourth contract address associated with the underlying digital asset S2013: providing fifth smart contract instructions (e.g. IMPL smart contract instructions) for the digital asset token associated with a fourth contract address associated with the underlying digital asset S2014: increasing the total supply of the digital asset token, by a digital asset token issuer system, from a first amount to a second amount (further detailed description in connection with FIGS. 20B-20C)

S2016: confirming, by the digital asset token issuer system, that the total supply of digital asset tokens is set to the second amount

FIG. 20A-1

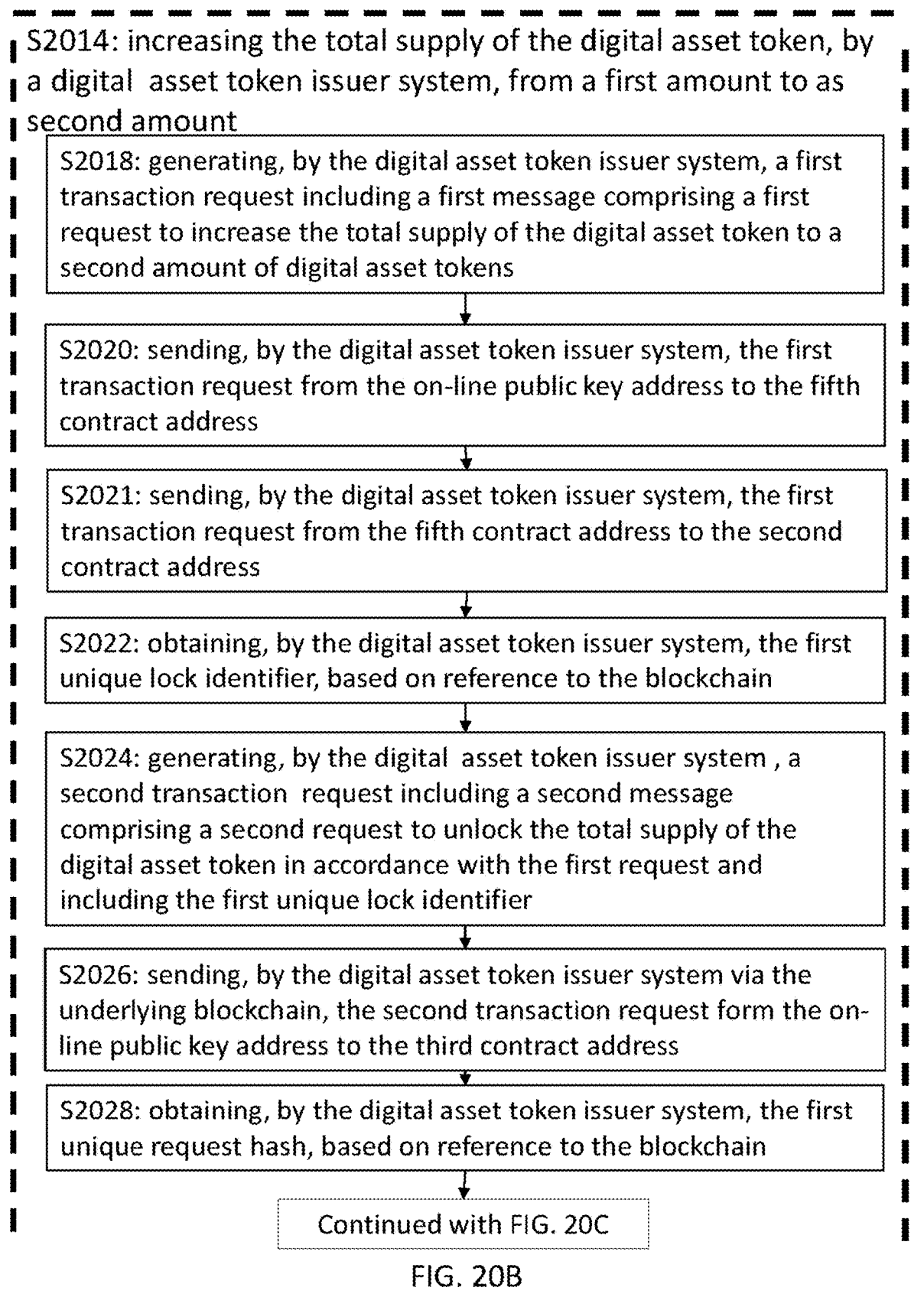

S2014: increasing the total supply of the digital asset token, by a digital asset token issuer system, from a first amount to as second amount S2018: generating, by the digital asset token issuer system, a first transaction request including a first message comprising a first request to increase the total supply of the digital asset token to a second amount of digital asset tokens S2020: sending, by the digital asset token issuer system, the first transaction request from the on-line public key address to the fifth contract address S2021: sending, by the digital asset token issuer system, the first transaction request from the fifth contract address to the second contract address S2022: obtaining, by the digital asset token issuer system, the first unique lock identifier, based on reference to the blockchain S2024: generating, by the digital asset token issuer system , a second transaction request including a second message comprising a second request to unlock the total supply of the digital asset token in accordance with the first request and including the first unique lock identifier S2026: sending, by the digital asset token issuer system via the underlying blockchain, the second transaction request form the on-line public key address to the third contract address S2028: obtaining, by the digital asset token issuer system, the first unique request hash, based on reference to the blockchain Continued with FIG. 20C

FIG. 20B

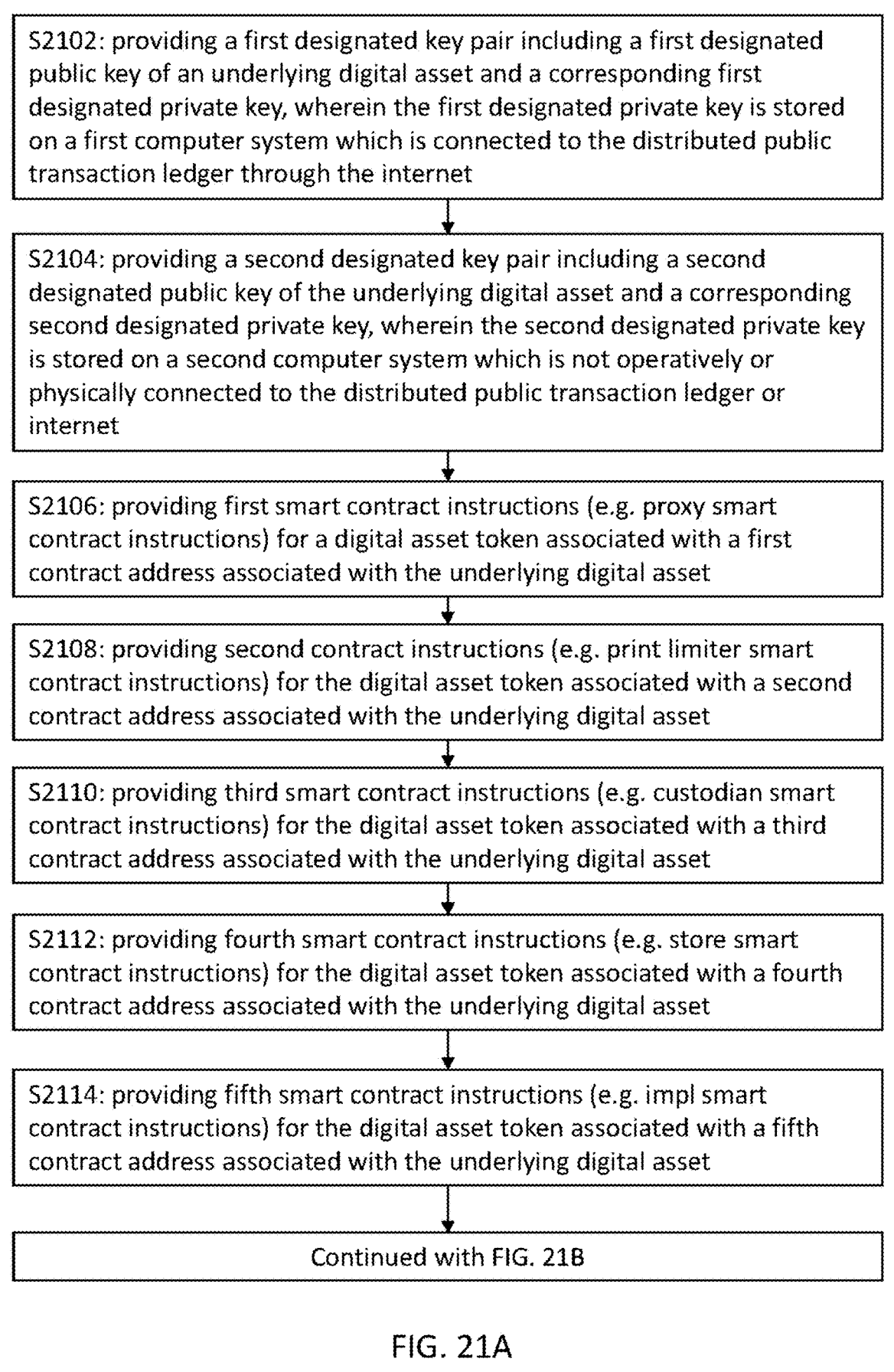

S2102: providing a first designated key pair including a first designated public key of an underlying digital asset and a corresponding first designated private key, wherein the first designated private key is stored on a first computer system which is connected to the distributed public transaction ledger through the internet

↓

S2104: providing a second designated key pair including a second designated public key of the underlying digital asset and a corresponding second designated private key, wherein the second designated private key is stored on a second computer system which is not operatively or physically connected to the distributed public transaction ledger or internet

↓

S2106: providing first smart contract instructions (e.g. proxy smart contract instructions) for a digital asset token associated with a first contract address associated with the underlying digital asset

↓

S2108: providing second contract instructions (e.g. print limiter smart contract instructions) for the digital asset token associated with a second contract address associated with the underlying digital asset

↓

S2110: providing third smart contract instructions (e.g. custodian smart contract instructions) for the digital asset token associated with a third contract address associated with the underlying digital asset

↓

S2112: providing fourth smart contract instructions (e.g. store smart contract instructions) for the digital asset token associated with a fourth contract address associated with the underlying digital asset

↓

S2114: providing fifth smart contract instructions (e.g. impl smart contract instructions) for the digital asset token associated with a fifth contract address associated with the underlying digital asset

↓

Continued with FIG. 21B

FIG. 21A

Published Contract 7102

| | |
|---|---|
| Inception Date 7104: | July 19, 2018 |
| Inception Value 7106: | $10,000 |
| Benchmark Data 7108: | S&P 500 |
| Contract Duration Data 7110: | 5 days |
| Collateral Requirement 7112: | 100 SV Coins |
| Notional Value 7114: | $10,000 |

FIG. 27A

Published Contract 7116

| | |
|---|---|
| Inception Date 7118: | July 20, 2018 |
| Inception Value 7120: | $1,000 |
| Benchmark Data 7122: | S&P 500 |
| Contract Duration Data 7124: | 2 Days |
| Collateral Requirement 7126: | 10 SV Coins |
| Notional Value 7128: | $1,000 |
| Early Termination Rules 7130: | None |
| Second Benchmark Data 7132: | Winkdex |

FIG. 27B

First Indication of Interest 7134

From: Alice
To: Gemini

ID No. 12345 (7136)
Buy (7138)

FIG. 27C

First Indication of Interest 7140

From: Alice
To: Gemini

ID No. 12345 (7142)
Buy (7144)
Alice Public Address (7146)
100 Stable Value Coins (7148)

FIG. 27D

Second Indication of Interest 7150

From: Bob
To: Gemini

ID No. 54321 (7152)
Sell (7154)

FIG. 27E

Second Indication of Interest 7156

From: Bob
To: Gemini

ID No. 54321 (7158)
Sell (7160)
Bob Public Address (7162)
100 Stable Value Coins (7164)

FIG. 27F

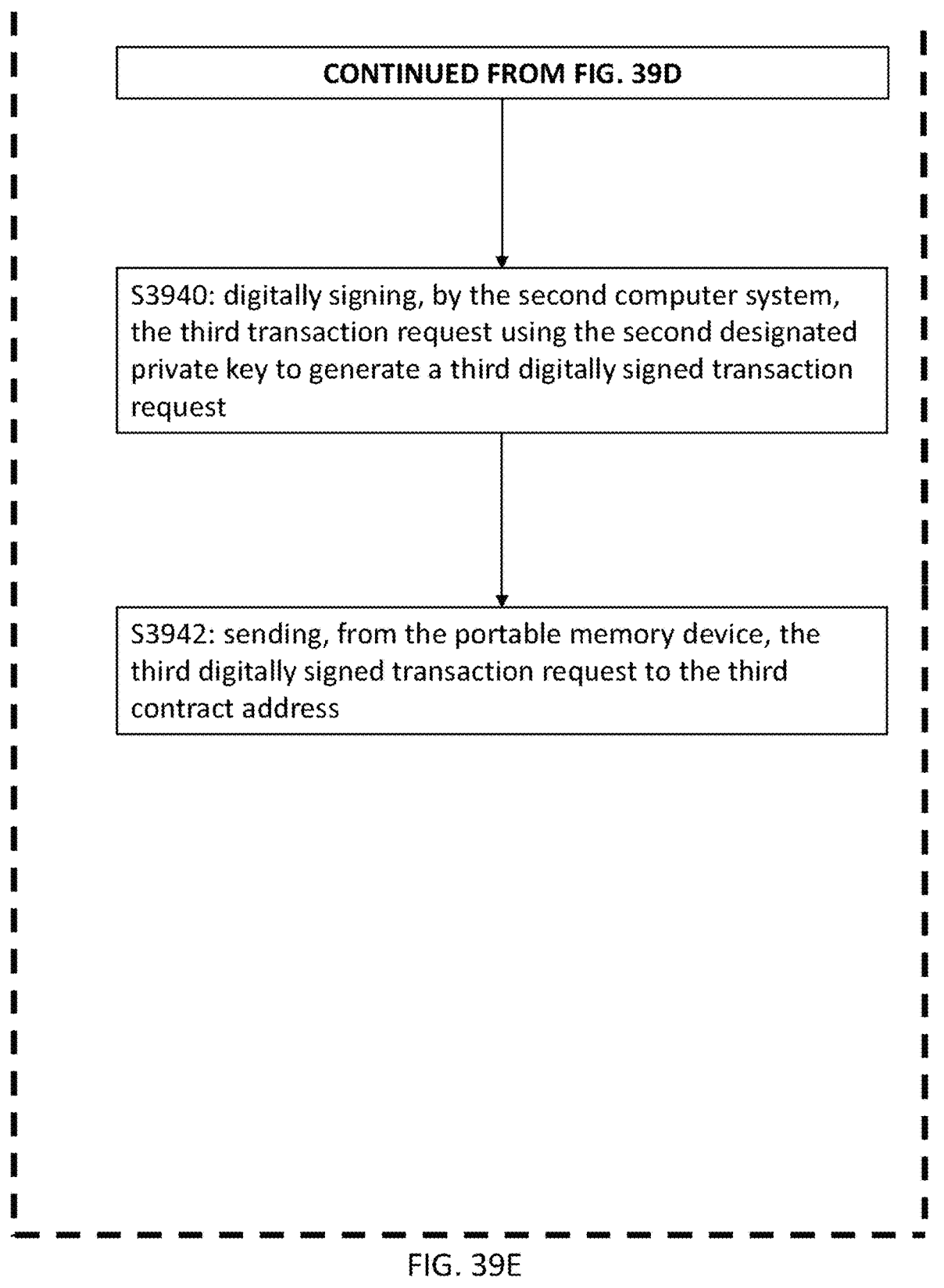

CONTINUED FROM FIG. 39D

S3940: digitally signing, by the second computer system, the third transaction request using the second designated private key to generate a third digitally signed transaction request S3942: sending, from the portable memory device, the third digitally signed transaction request to the third contract address

FIG. 39E

FIG. 52A
Shop NFTs
Purchase collectibles from your favorite games with just a credit card.
OpenSea
Gods Unchained

Time Until Auction Close

00:00:28

Current Auction Data (10/02/2016)

○ *Indicative Auction Result* ● *Final Auction Result*

| Time (ET) | Highest Bid ($)* | Lowest Ask ($)* | Indicative Price ($) | Auction Qty (BTC) | Diff ($) | Diff (%) |
|---|---|---|---|---|---|---|
| ○ 15:59:30 | 604.98 | 605.45 | 604.25 | 1600.00 | -0.97 | -0.16 |
| ○ 15:59:15 | 604.98 | 605.45 | 604.25 | 1600.00 | -0.97 | -0.16 |
| ○ 15:59:00 | 604.98 | 605.44 | 604.48 | 1149.70 | -0.73 | -0.12 |
| ○ 15:58:00 | 605.47 | 605.48 | 604.48 | 1155.26 | -1.00 | -0.16 |
| ○ 15:57:00 | 605.47 | 605.48 | 604.49 | 1100.00 | -0.99 | -0.16 |
| ○ 15:56:00 | 605.47 | 605.48 | 604.90 | 1103.11 | -0.58 | -0.09 |
| ○ 15:55:00 | 605.47 | 605.48 | 604.25 | 1141.90 | -1.23 | -0.20 |

*Highest Bid ($) and Lowest Ask ($) are from the continuous trading order book at the time of the indicative or final auction event.*

T1 - Taker Request

5902
From: FundX
To: Digital Asset Exchange
Request:
Side: Buy
Digital Asset: BTC
Amount: 1,000 [BTC]
Max Price: $10,100

Bid/Ask Spread from continuous book at T1 is $9,999/$10,001

T2 - IOIs to Market Makers 1... n

5904
To: Market Maker [1...n]
From: Digital Asset Exchange
IOI:
Digital Asset: BTC
Amount: 1,000 [BTC]
Collar : $9,500/10,500
Time Max: 1 Min Market Makers 1, 2 and 3 responses T3' 5906a'
From: Market Maker 1
From: Digital Asset Exchange
Response:
Buy: 300 BTC@9,950
Sell: 300 BTC@10,050

T4' 5906b'
From: Market Maker 2
From: Digital Asset Exchange
Response:
Buy: 200 BTC@9,900
Sell: 200 BTC@10,150

T5' 5906c'
From: Market Maker 3
From: Digital Asset Exchange
Response:
Buy: 100 BTC@9,950
Sell: 100 BTC @10,050

T6' 5906d'
From: Market Maker 1
From: Digital Asset Exchange
Response:
Buy: 300 BTC@9,970
Sell: 300 BTC@10,020

T7' 5906e'
From: Market Maker 2
From: Digital Asset Exchange
Response:
Buy: 200 BTC@9,950
Sell: 200 BTC@10,200

T8' 5906f'
From: Market Maker 3
From: Digital Asset Exchange
Response:
Buy: 500 BTC@9,975
Sell: 500 BTC @10,250

T9' = T2 + 1 min.

5908b'
From: Digital Asset Exchange
To: Market Maker 1
Your order to sell 300 BTC at $10,020 is filled and your order to sell 300 BTC at $10,050 is filled.
Would you like to sell an additional 300 BTC at $10,050?

5908a'
From: Digital Asset Exchange
To: Target
Your order to buy 300 BTC at $10,020 is filled.
Your order to buy 400 BTC at $10,050 is filled.

5908c'
From: Digital Asset Exchange
To: Market Maker 3
Your order to sell 100 BTC at $10,050 is filled.

FIG. 82E
Buy BTC
$32,203.23
37.2324BTC
$35,392.32
$258.23
$12.28
$428.29 - $412.34
Open Orders
Transaction History

FIG. 82F
Buy BTC
$32,203.23
37.2324BTC
$36,392.33
$258.23
$12.20
$438.29 - $412.34
Open Orders
Transaction History

FIG. 90A
FIG. 90B
11:07 A.M.
July 2, 2013
Digital Asset Alert:
The price ratio of Bitcoins
to Litecoins has dropped
by 15%
2:00 P.M.
July 2, 2013
New SMS:
The price of Bitcoins is
dropping by 22%/hour.

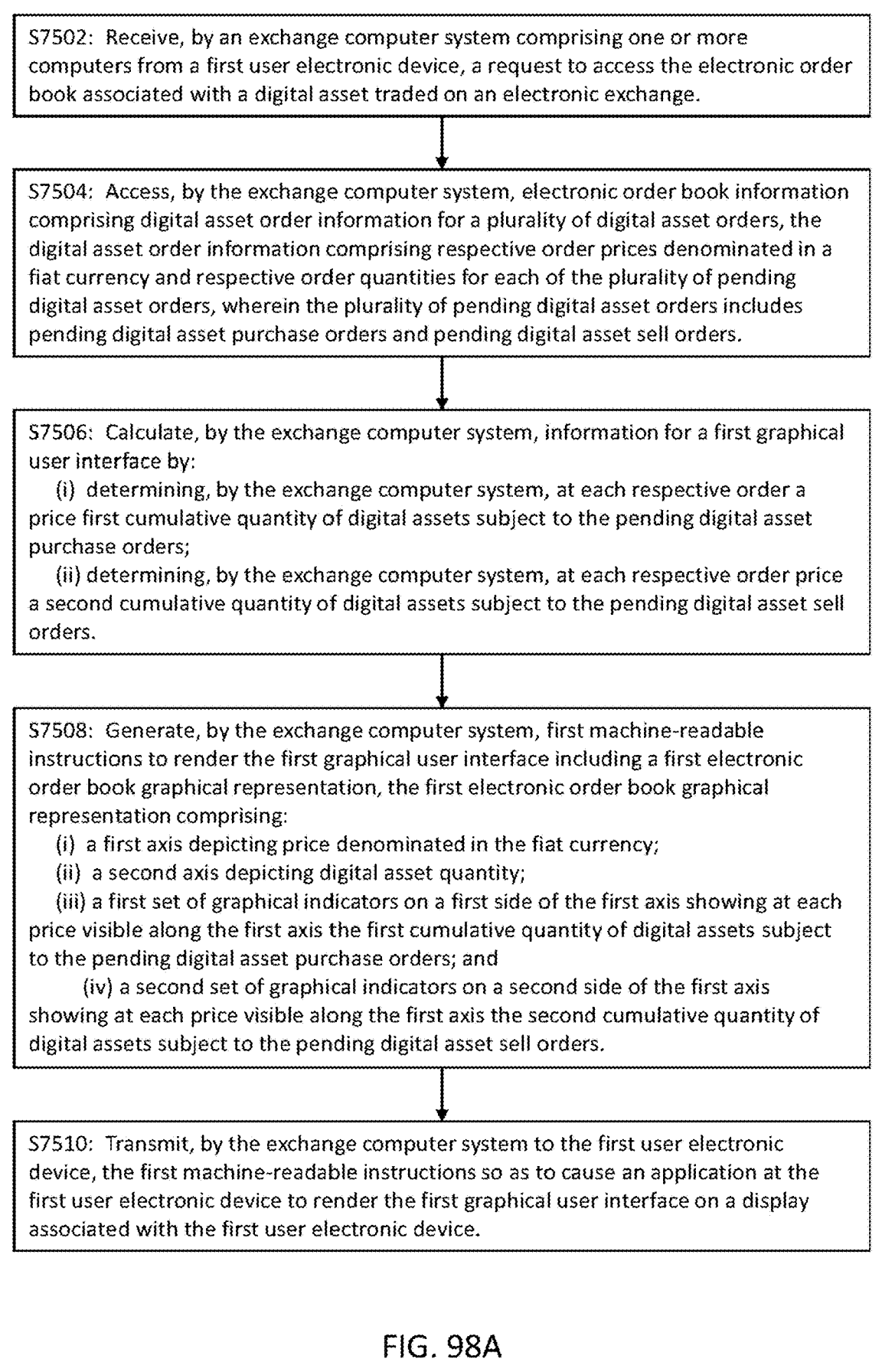

S7502: Receive, by an exchange computer system comprising one or more computers from a first user electronic device, a request to access the electronic order book associated with a digital asset traded on an electronic exchange.

↓

S7504: Access, by the exchange computer system, electronic order book information comprising digital asset order information for a plurality of digital asset orders, the digital asset order information comprising respective order prices denominated in a fiat currency and respective order quantities for each of the plurality of pending digital asset orders, wherein the plurality of pending digital asset orders includes pending digital asset purchase orders and pending digital asset sell orders.

↓

S7506: Calculate, by the exchange computer system, information for a first graphical user interface by:

(i) determining, by the exchange computer system, at each respective order a price first cumulative quantity of digital assets subject to the pending digital asset purchase orders;

(ii) determining, by the exchange computer system, at each respective order price a second cumulative quantity of digital assets subject to the pending digital asset sell orders.

↓

S7508: Generate, by the exchange computer system, first machine-readable instructions to render the first graphical user interface including a first electronic order book graphical representation, the first electronic order book graphical representation comprising:

(i) a first axis depicting price denominated in the fiat currency;

(ii) a second axis depicting digital asset quantity;

(iii) a first set of graphical indicators on a first side of the first axis showing at each price visible along the first axis the first cumulative quantity of digital assets subject to the pending digital asset purchase orders; and (iv) a second set of graphical indicators on a second side of the first axis showing at each price visible along the first axis the second cumulative quantity of digital assets subject to the pending digital asset sell orders.

↓

S7510: Transmit, by the exchange computer system to the first user electronic device, the first machine-readable instructions so as to cause an application at the first user electronic device to render the first graphical user interface on a display associated with the first user electronic device.

FIG. 98A

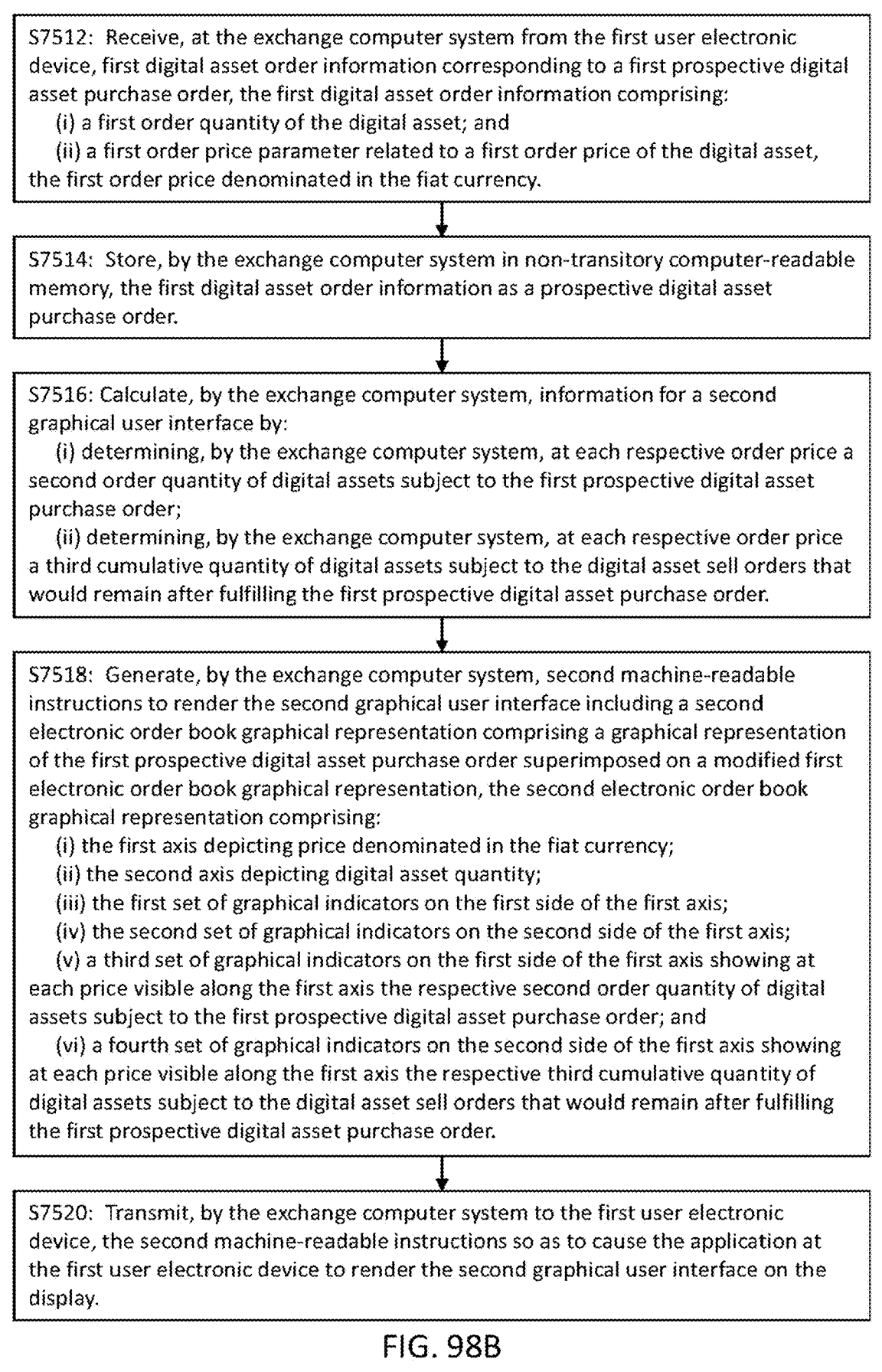

S7512: Receive, at the exchange computer system from the first user electronic device, first digital asset order information corresponding to a first prospective digital asset purchase order, the first digital asset order information comprising:
(i) a first order quantity of the digital asset; and
(ii) a first order price parameter related to a first order price of the digital asset, the first order price denominated in the fiat currency.

↓

S7514: Store, by the exchange computer system in non-transitory computer-readable memory, the first digital asset order information as a prospective digital asset purchase order.

↓

S7516: Calculate, by the exchange computer system, information for a second graphical user interface by:
(i) determining, by the exchange computer system, at each respective order price a second order quantity of digital assets subject to the first prospective digital asset purchase order;
(ii) determining, by the exchange computer system, at each respective order price a third cumulative quantity of digital assets subject to the digital asset sell orders that would remain after fulfilling the first prospective digital asset purchase order.

↓

S7518: Generate, by the exchange computer system, second machine-readable instructions to render the second graphical user interface including a second electronic order book graphical representation comprising a graphical representation of the first prospective digital asset purchase order superimposed on a modified first electronic order book graphical representation, the second electronic order book graphical representation comprising:
(i) the first axis depicting price denominated in the fiat currency;
(ii) the second axis depicting digital asset quantity;
(iii) the first set of graphical indicators on the first side of the first axis;
(iv) the second set of graphical indicators on the second side of the first axis;
(v) a third set of graphical indicators on the first side of the first axis showing at each price visible along the first axis the respective second order quantity of digital assets subject to the first prospective digital asset purchase order; and
(vi) a fourth set of graphical indicators on the second side of the first axis showing at each price visible along the first axis the respective third cumulative quantity of digital assets subject to the digital asset sell orders that would remain after fulfilling the first prospective digital asset purchase order.

↓

S7520: Transmit, by the exchange computer system to the first user electronic device, the second machine-readable instructions so as to cause the application at the first user electronic device to render the second graphical user interface on the display.

FIG. 98B

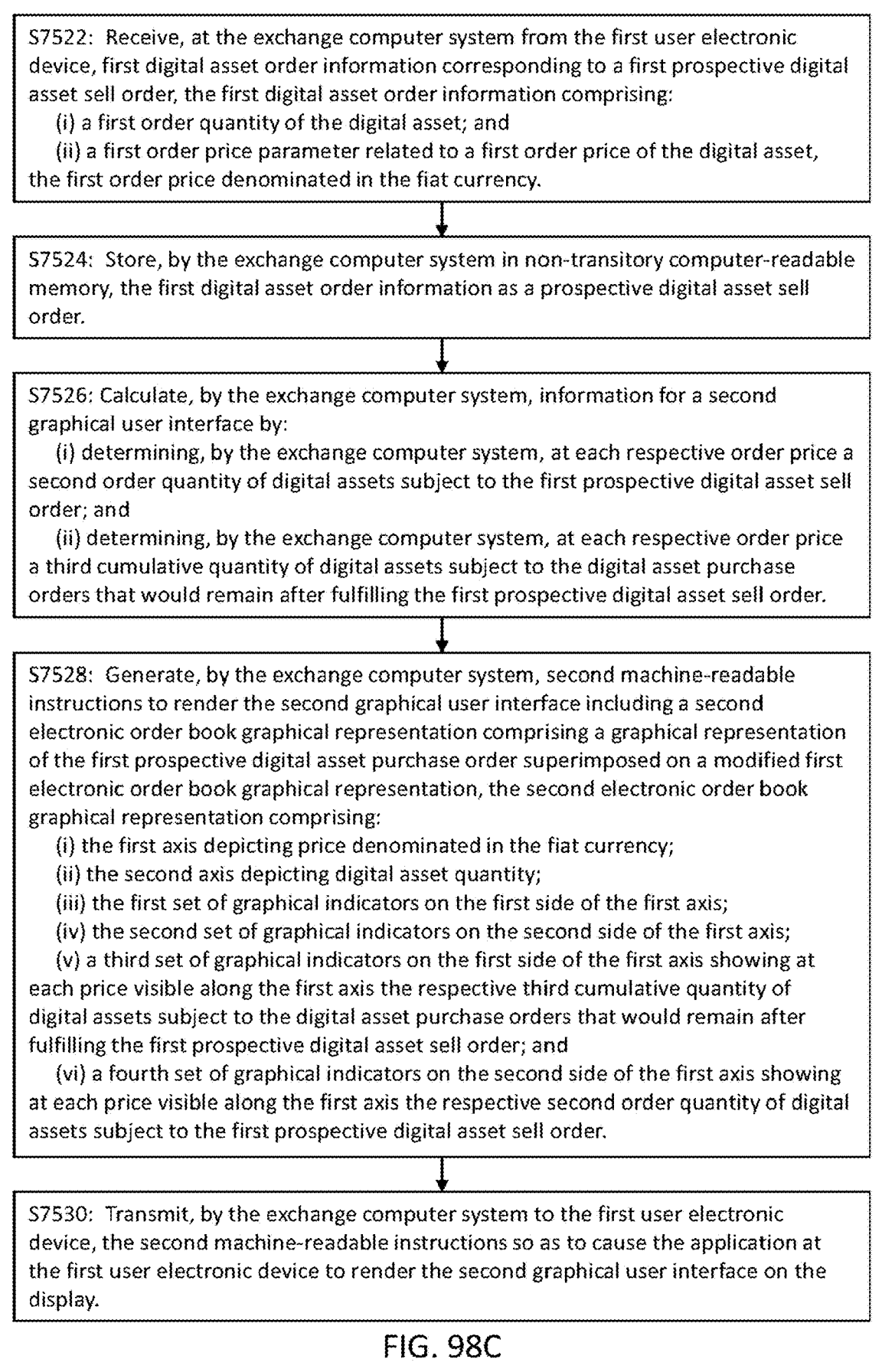

S7522: Receive, at the exchange computer system from the first user electronic device, first digital asset order information corresponding to a first prospective digital asset sell order, the first digital asset order information comprising:
(i) a first order quantity of the digital asset; and
(ii) a first order price parameter related to a first order price of the digital asset, the first order price denominated in the fiat currency.

↓

S7524: Store, by the exchange computer system in non-transitory computer-readable memory, the first digital asset order information as a prospective digital asset sell order.

↓

S7526: Calculate, by the exchange computer system, information for a second graphical user interface by:
(i) determining, by the exchange computer system, at each respective order price a second order quantity of digital assets subject to the first prospective digital asset sell order; and
(ii) determining, by the exchange computer system, at each respective order price a third cumulative quantity of digital assets subject to the digital asset purchase orders that would remain after fulfilling the first prospective digital asset sell order.

↓

S7528: Generate, by the exchange computer system, second machine-readable instructions to render the second graphical user interface including a second electronic order book graphical representation comprising a graphical representation of the first prospective digital asset purchase order superimposed on a modified first electronic order book graphical representation, the second electronic order book graphical representation comprising:
(i) the first axis depicting price denominated in the fiat currency;
(ii) the second axis depicting digital asset quantity;
(iii) the first set of graphical indicators on the first side of the first axis;
(iv) the second set of graphical indicators on the second side of the first axis;
(v) a third set of graphical indicators on the first side of the first axis showing at each price visible along the first axis the respective third cumulative quantity of digital assets subject to the digital asset purchase orders that would remain after fulfilling the first prospective digital asset sell order; and
(vi) a fourth set of graphical indicators on the second side of the first axis showing at each price visible along the first axis the respective second order quantity of digital assets subject to the first prospective digital asset sell order.

↓

S7530: Transmit, by the exchange computer system to the first user electronic device, the second machine-readable instructions so as to cause the application at the first user electronic device to render the second graphical user interface on the display.

FIG. 98C

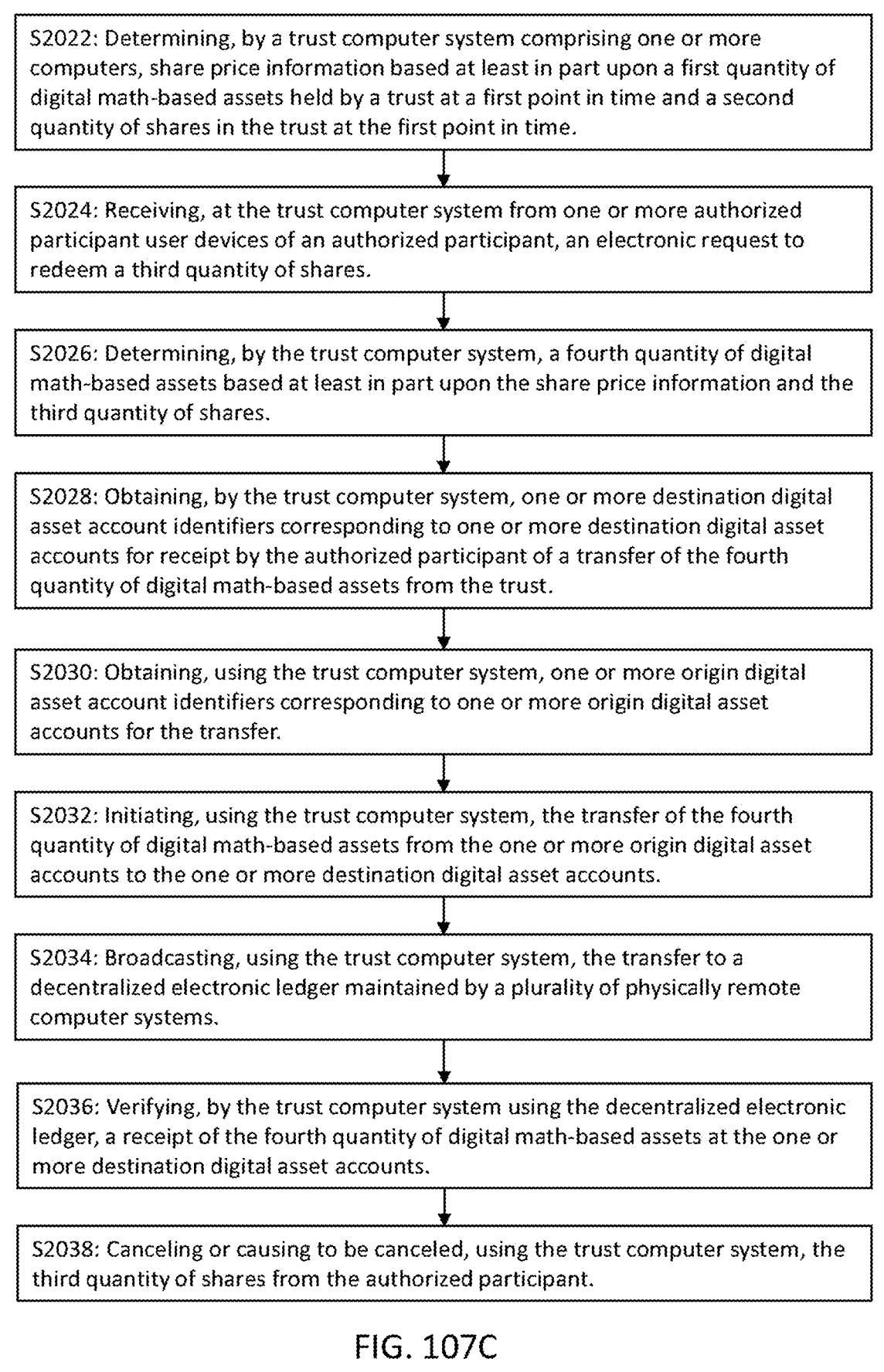

S2022: Determining, by a trust computer system comprising one or more computers, share price information based at least in part upon a first quantity of digital math-based assets held by a trust at a first point in time and a second quantity of shares in the trust at the first point in time.

↓

S2024: Receiving, at the trust computer system from one or more authorized participant user devices of an authorized participant, an electronic request to redeem a third quantity of shares.

↓

S2026: Determining, by the trust computer system, a fourth quantity of digital math-based assets based at least in part upon the share price information and the third quantity of shares.

↓

S2028: Obtaining, by the trust computer system, one or more destination digital asset account identifiers corresponding to one or more destination digital asset accounts for receipt by the authorized participant of a transfer of the fourth quantity of digital math-based assets from the trust.

↓

S2030: Obtaining, using the trust computer system, one or more origin digital asset account identifiers corresponding to one or more origin digital asset accounts for the transfer.

↓

S2032: Initiating, using the trust computer system, the transfer of the fourth quantity of digital math-based assets from the one or more origin digital asset accounts to the one or more destination digital asset accounts.

↓

S2034: Broadcasting, using the trust computer system, the transfer to a decentralized electronic ledger maintained by a plurality of physically remote computer systems.

↓

S2036: Verifying, by the trust computer system using the decentralized electronic ledger, a receipt of the fourth quantity of digital math-based assets at the one or more destination digital asset accounts.

↓

S2038: Canceling or causing to be canceled, using the trust computer system, the third quantity of shares from the authorized participant.

FIG. 107C

Figure 109A:
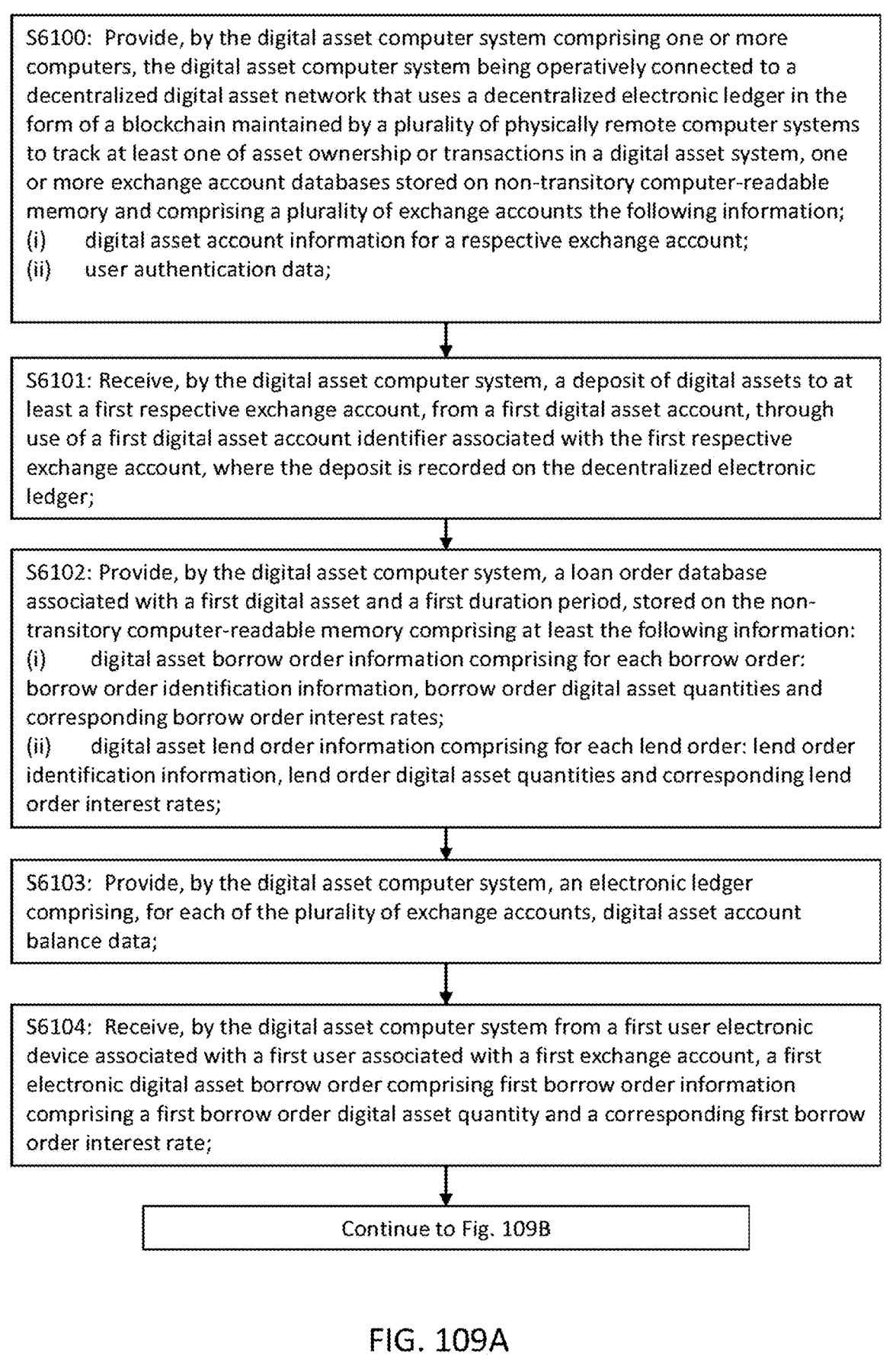

S6100: Provide, by the digital asset computer system comprising one or more computers, the digital asset computer system being operatively connected to a decentralized digital asset network that uses a decentralized electronic ledger in the form of a blockchain maintained by a plurality of physically remote computer systems to track at least one of asset ownership or transactions in a digital asset system, one or more exchange account databases stored on non-transitory computer-readable memory and comprising a plurality of exchange accounts the following information;
(i) digital asset account information for a respective exchange account;
(ii) user authentication data;

↓

S6101: Receive, by the digital asset computer system, a deposit of digital assets to at least a first respective exchange account, from a first digital asset account, through use of a first digital asset account identifier associated with the first respective exchange account, where the deposit is recorded on the decentralized electronic ledger;

↓

S6102: Provide, by the digital asset computer system, a loan order database associated with a first digital asset and a first duration period, stored on the non-transitory computer-readable memory comprising at least the following information:
(i) digital asset borrow order information comprising for each borrow order: borrow order identification information, borrow order digital asset quantities and corresponding borrow order interest rates;
(ii) digital asset lend order information comprising for each lend order: lend order identification information, lend order digital asset quantities and corresponding lend order interest rates;

↓

S6103: Provide, by the digital asset computer system, an electronic ledger comprising, for each of the plurality of exchange accounts, digital asset account balance data;

↓

S6104: Receive, by the digital asset computer system from a first user electronic device associated with a first user associated with a first exchange account, a first electronic digital asset borrow order comprising first borrow order information comprising a first borrow order digital asset quantity and a corresponding first borrow order interest rate;

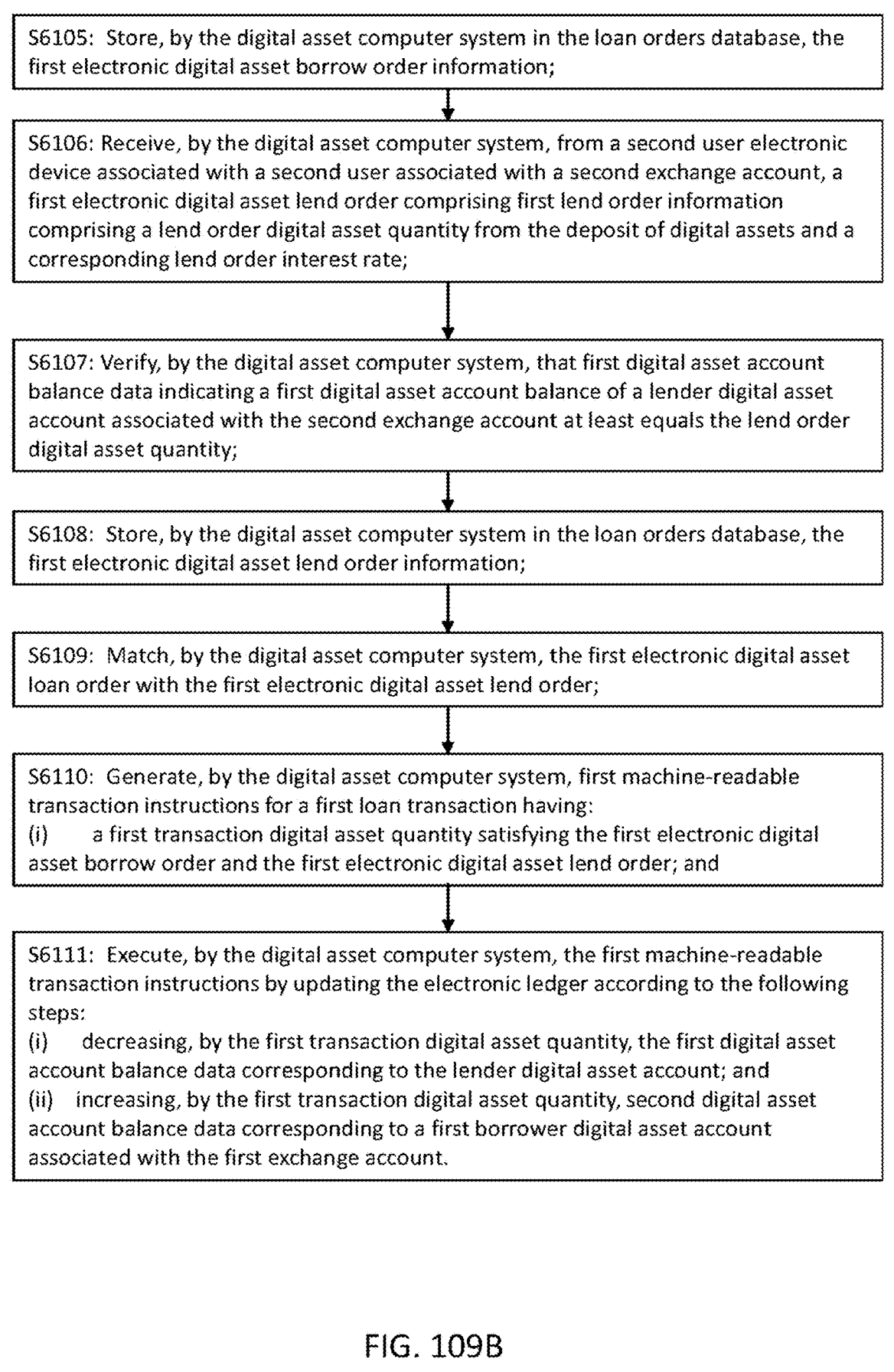

S6105: Store, by the digital asset computer system in the loan orders database, the first electronic digital asset borrow order information;

S6106: Receive, by the digital asset computer system, from a second user electronic device associated with a second user associated with a second exchange account, a first electronic digital asset lend order comprising first lend order information comprising a lend order digital asset quantity from the deposit of digital assets and a corresponding lend order interest rate;

S6107: Verify, by the digital asset computer system, that first digital asset account balance data indicating a first digital asset account balance of a lender digital asset account associated with the second exchange account at least equals the lend order digital asset quantity;

S6108: Store, by the digital asset computer system in the loan orders database, the first electronic digital asset lend order information;

S6109: Match, by the digital asset computer system, the first electronic digital asset loan order with the first electronic digital asset lend order;

S6110: Generate, by the digital asset computer system, first machine-readable transaction instructions for a first loan transaction having:
(i) a first transaction digital asset quantity satisfying the first electronic digital asset borrow order and the first electronic digital asset lend order; and S6111: Execute, by the digital asset computer system, the first machine-readable transaction instructions by updating the electronic ledger according to the following steps:
(i) decreasing, by the first transaction digital asset quantity, the first digital asset account balance data corresponding to the lender digital asset account; and
(ii) increasing, by the first transaction digital asset quantity, second digital asset account balance data corresponding to a first borrower digital asset account associated with the first exchange account.

FIG. 109B

Figure 110A:
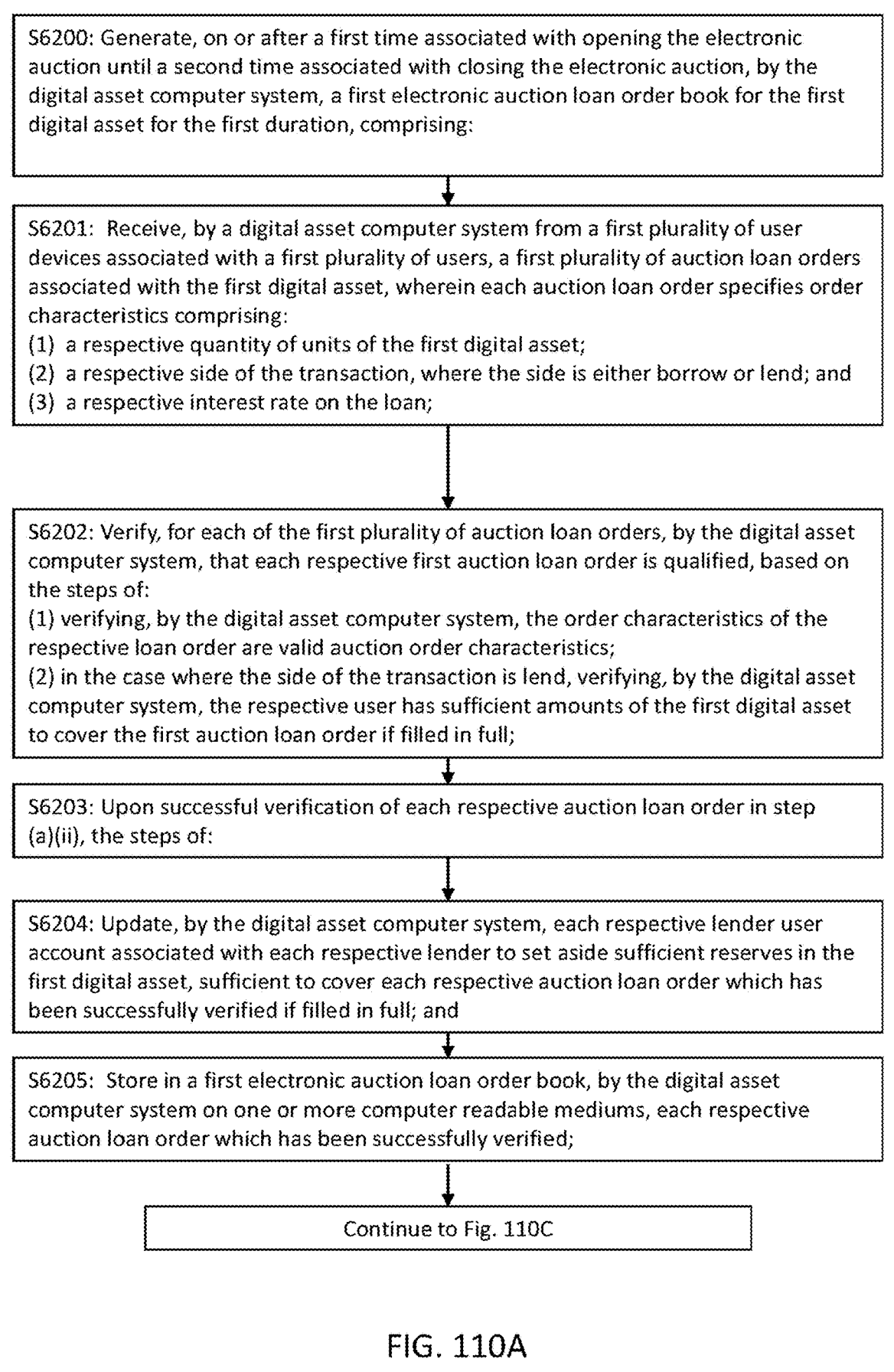

S6200: Generate, on or after a first time associated with opening the electronic auction until a second time associated with closing the electronic auction, by the digital asset computer system, a first electronic auction loan order book for the first digital asset for the first duration, comprising:

S6201: Receive, by a digital asset computer system from a first plurality of user devices associated with a first plurality of users, a first plurality of auction loan orders associated with the first digital asset, wherein each auction loan order specifies order characteristics comprising:
(1) a respective quantity of units of the first digital asset;
(2) a respective side of the transaction, where the side is either borrow or lend; and
(3) a respective interest rate on the loan;

S6202: Verify, for each of the first plurality of auction loan orders, by the digital asset computer system, that each respective first auction loan order is qualified, based on the steps of:
(1) verifying, by the digital asset computer system, the order characteristics of the respective loan order are valid auction order characteristics;
(2) in the case where the side of the transaction is lend, verifying, by the digital asset computer system, the respective user has sufficient amounts of the first digital asset to cover the first auction loan order if filled in full;

S6203: Upon successful verification of each respective auction loan order in step (a)(ii), the steps of:

S6204: Update, by the digital asset computer system, each respective lender user account associated with each respective lender to set aside sufficient reserves in the first digital asset, sufficient to cover each respective auction loan order which has been successfully verified if filled in full; and S6205: Store in a first electronic auction loan order book, by the digital asset computer system on one or more computer readable mediums, each respective auction loan order which has been successfully verified;

Continue to Fig. 110C

FIG. 110A (Optional) S6206: Electronically publish, starting with a third time and continuing until the second time, by the digital asset computer system, at set time intervals between the third time and the second time, respective indicative results of the first auction loan order book if the auction were to close at the end of each respective time interval, wherein the respective indicative results comprise:

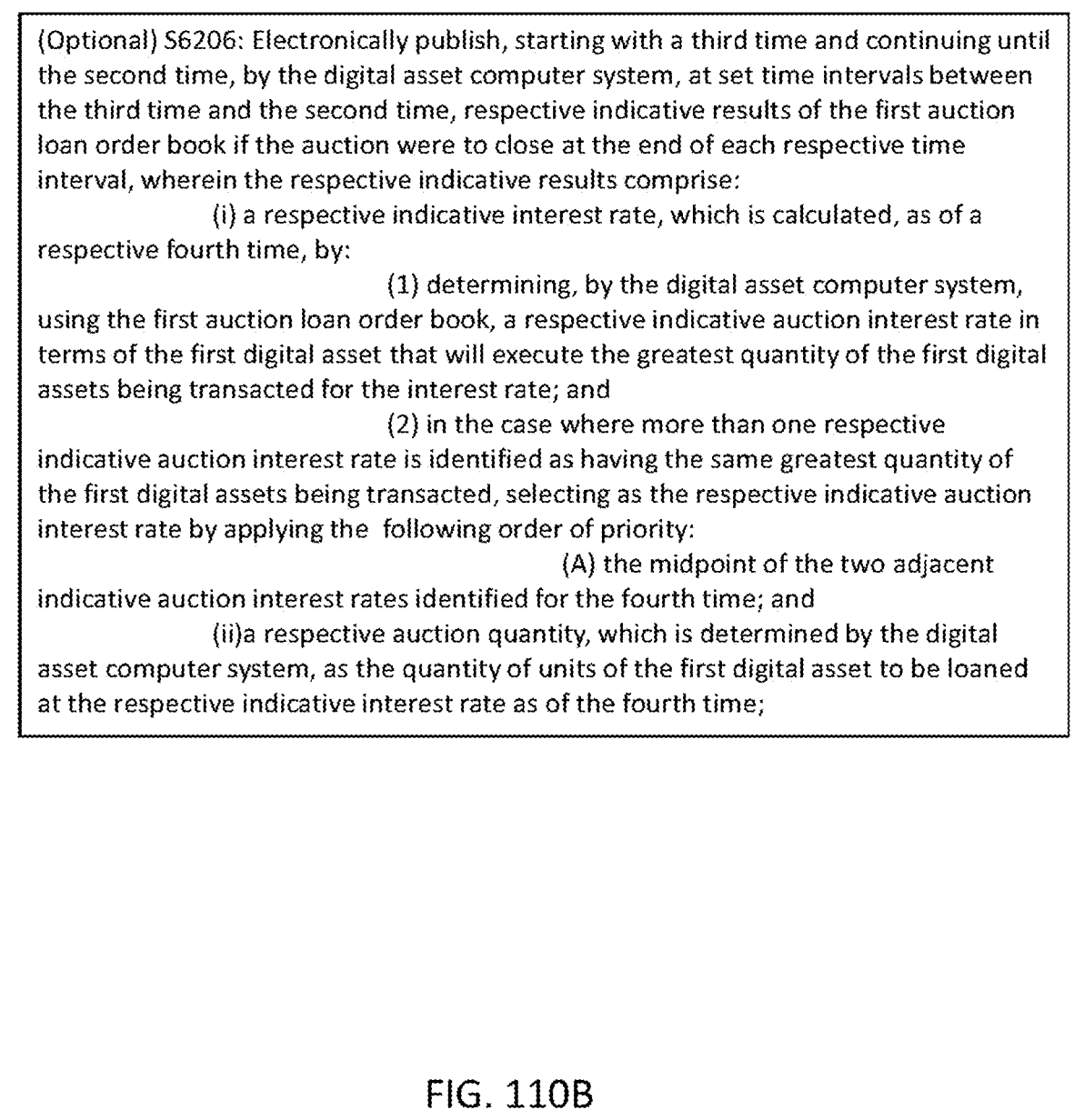

(i) a respective indicative interest rate, which is calculated, as of a respective fourth time, by:

(1) determining, by the digital asset computer system, using the first auction loan order book, a respective indicative auction interest rate in terms of the first digital asset that will execute the greatest quantity of the first digital assets being transacted for the interest rate; and (2) in the case where more than one respective indicative auction interest rate is identified as having the same greatest quantity of the first digital assets being transacted, selecting as the respective indicative auction interest rate by applying the following order of priority:

(A) the midpoint of the two adjacent indicative auction interest rates identified for the fourth time; and (ii)a respective auction quantity, which is determined by the digital asset computer system, as the quantity of units of the first digital asset to be loaned at the respective indicative interest rate as of the fourth time;

FIG. 110B

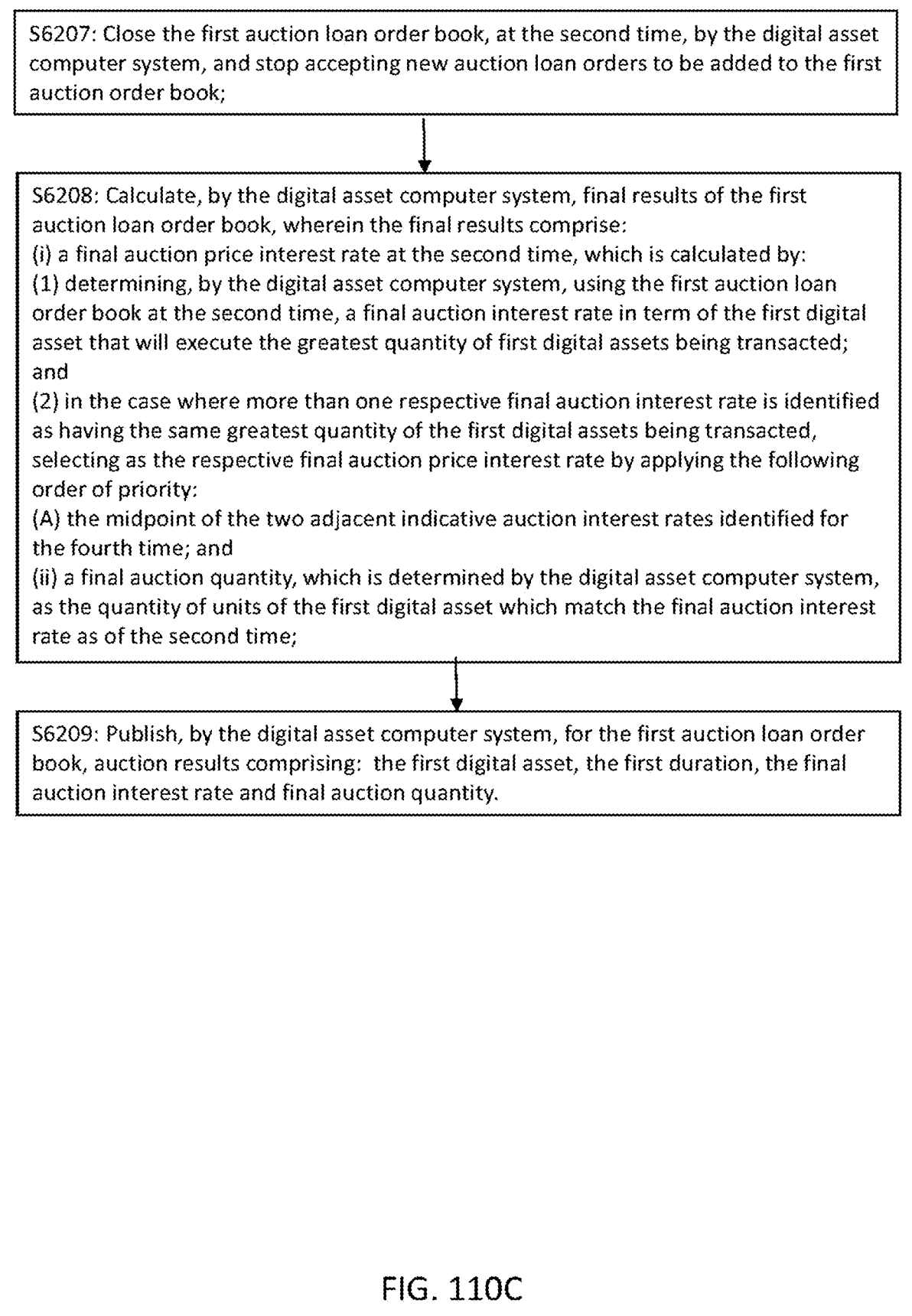

S6207: Close the first auction loan order book, at the second time, by the digital asset computer system, and stop accepting new auction loan orders to be added to the first auction order book;

↓

S6208: Calculate, by the digital asset computer system, final results of the first auction loan order book, wherein the final results comprise:
(i) a final auction price interest rate at the second time, which is calculated by:
(1) determining, by the digital asset computer system, using the first auction loan order book at the second time, a final auction interest rate in term of the first digital asset that will execute the greatest quantity of first digital assets being transacted; and
(2) in the case where more than one respective final auction interest rate is identified as having the same greatest quantity of the first digital assets being transacted, selecting as the respective final auction price interest rate by applying the following order of priority:
(A) the midpoint of the two adjacent indicative auction interest rates identified for the fourth time; and
(ii) a final auction quantity, which is determined by the digital asset computer system, as the quantity of units of the first digital asset which match the final auction interest rate as of the second time;

↓

S6209: Publish, by the digital asset computer system, for the first auction loan order book, auction results comprising: the first digital asset, the first duration, the final auction interest rate and final auction quantity.

FIG. 110C

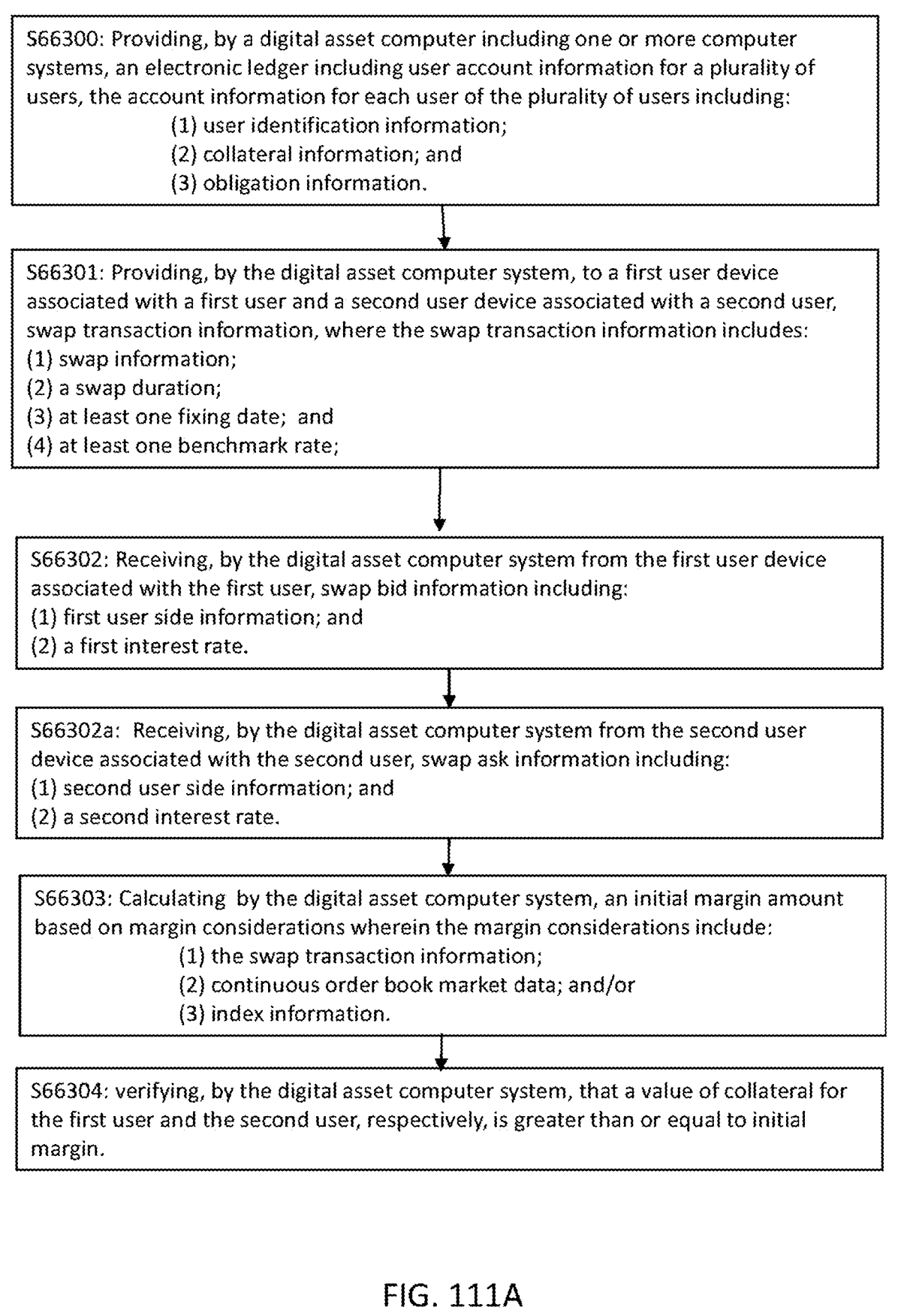

S66300: Providing, by a digital asset computer including one or more computer systems, an electronic ledger including user account information for a plurality of users, the account information for each user of the plurality of users including:
(1) user identification information;
(2) collateral information; and
(3) obligation information.

↓

S66301: Providing, by the digital asset computer system, to a first user device associated with a first user and a second user device associated with a second user, swap transaction information, where the swap transaction information includes:
(1) swap information;
(2) a swap duration;
(3) at least one fixing date; and
(4) at least one benchmark rate;

↓

S66302: Receiving, by the digital asset computer system from the first user device associated with the first user, swap bid information including:
(1) first user side information; and
(2) a first interest rate.

↓

S66302a: Receiving, by the digital asset computer system from the second user device associated with the second user, swap ask information including:
(1) second user side information; and
(2) a second interest rate.

↓

S66303: Calculating by the digital asset computer system, an initial margin amount based on margin considerations wherein the margin considerations include:
(1) the swap transaction information;
(2) continuous order book market data; and/or
(3) index information.

↓

S66304: verifying, by the digital asset computer system, that a value of collateral for the first user and the second user, respectively, is greater than or equal to initial margin.

FIG. 111A

Figure 111B:
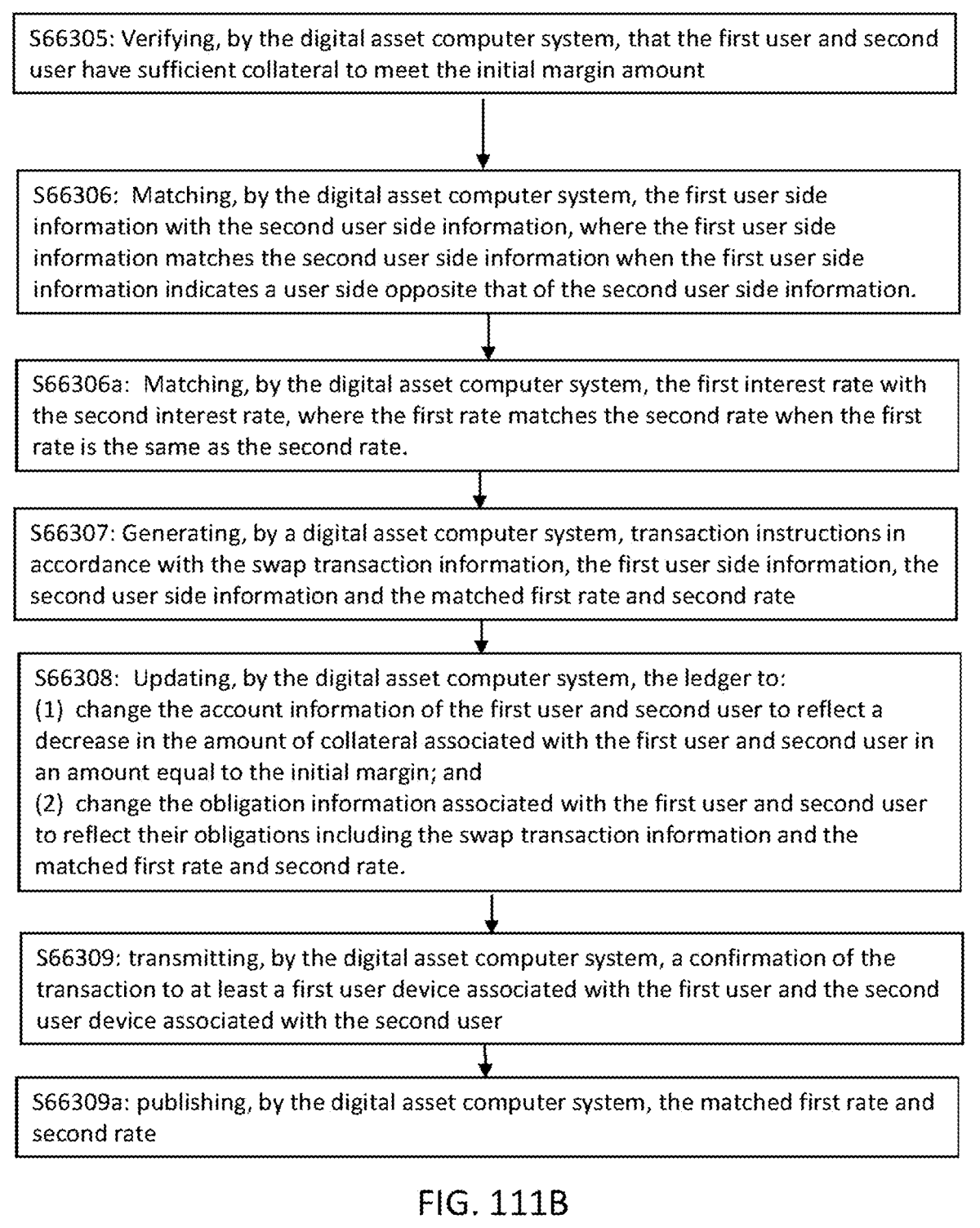

S66305: Verifying, by the digital asset computer system, that the first user and second user have sufficient collateral to meet the initial margin amount

↓

S66306: Matching, by the digital asset computer system, the first user side information with the second user side information, where the first user side information matches the second user side information when the first user side information indicates a user side opposite that of the second user side information.

↓

S66306a: Matching, by the digital asset computer system, the first interest rate with the second interest rate, where the first rate matches the second rate when the first rate is the same as the second rate.

↓

S66307: Generating, by a digital asset computer system, transaction instructions in accordance with the swap transaction information, the first user side information, the second user side information and the matched first rate and second rate

↓

S66308: Updating, by the digital asset computer system, the ledger to:
(1) change the account information of the first user and second user to reflect a decrease in the amount of collateral associated with the first user and second user in an amount equal to the initial margin; and
(2) change the obligation information associated with the first user and second user to reflect their obligations including the swap transaction information and the matched first rate and second rate.

↓

S66309: transmitting, by the digital asset computer system, a confirmation of the transaction to at least a first user device associated with the first user and the second user device associated with the second user

↓

S66309a: publishing, by the digital asset computer system, the matched first rate and second rate

FIG. 111B (Optional) S66310: recalculating, by the digital asset computer system, the margin to provide a variation margin.

↓

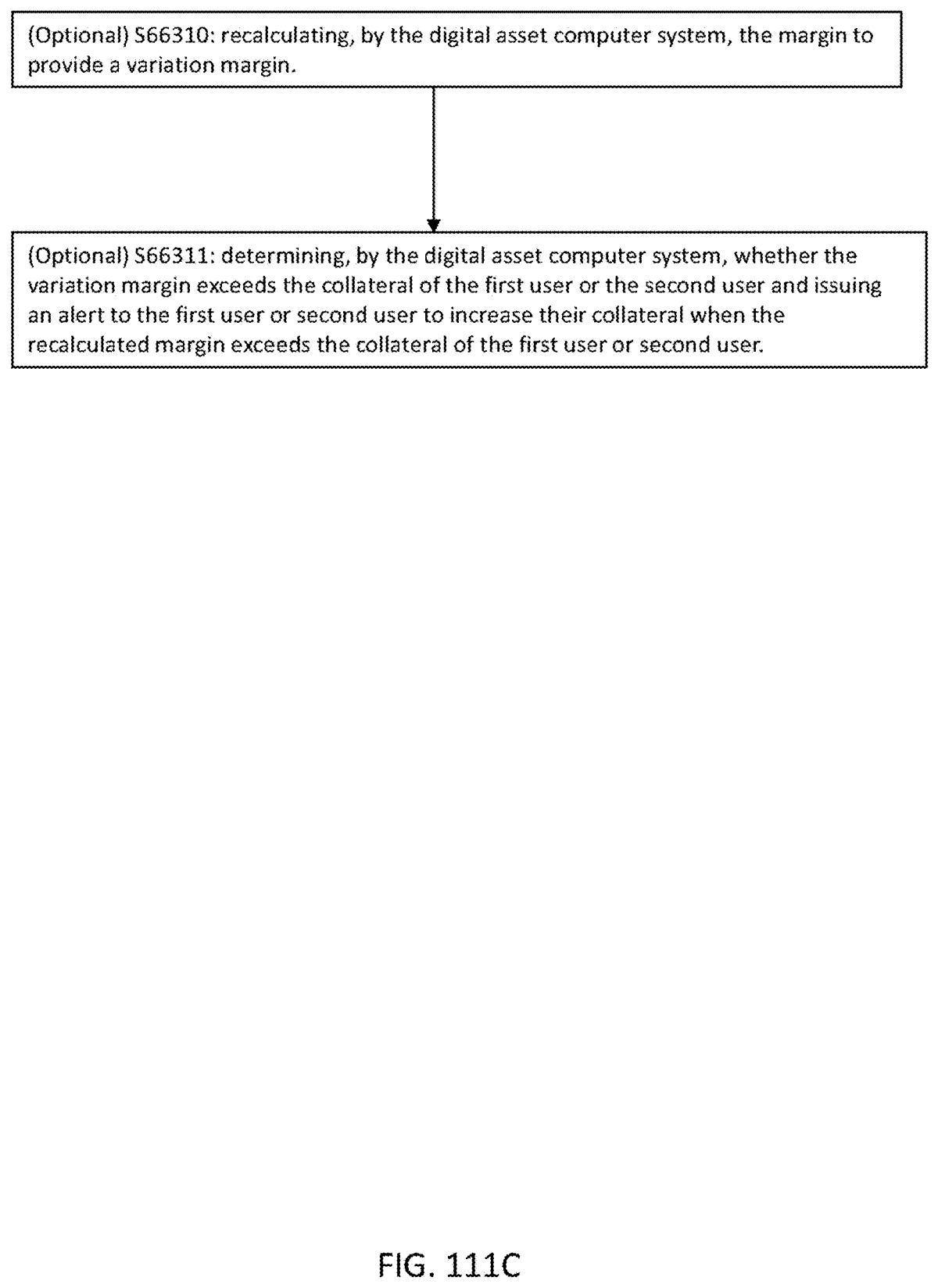

(Optional) S66311: determining, by the digital asset computer system, whether the variation margin exceeds the collateral of the first user or the second user and issuing an alert to the first user or second user to increase their collateral when the recalculated margin exceeds the collateral of the first user or second user.

FIG. 111C

| Dispute Message 9602 | |
|---|---|
| First Digitally Signed Benchmark Message | 9604 |
| Second Digitally Signed Benchmark Message | 9606 |
| First Current Benchmark Data | 9608 |
| First Time Stamp | 9610 |
| Second Current Benchmark Data | 9612 |
| Second Time Stamp | 9614 |

FIG. 114A

| First Digitally Signed Benchmark Message 9604 | |
|---|---|
| First Oracle Identification | 9616 |
| First Current Benchmark Data | 9618 |
| First Time Stamp | 9620 |
| First Oracle Digital Signature | 9622 |

FIG. 114B

| Second Digitally Signed Benchmark Message 9606 | |
|---|---|
| Second Oracle Identification | 9624 |
| Second Current Benchmark Data | 9626 |
| Second Time Stamp | 9628 |
| Second Oracle Digital Signature | 9630 |

FIG. 114C

Asymmetrical Puzzle Sequence Diagram

T1
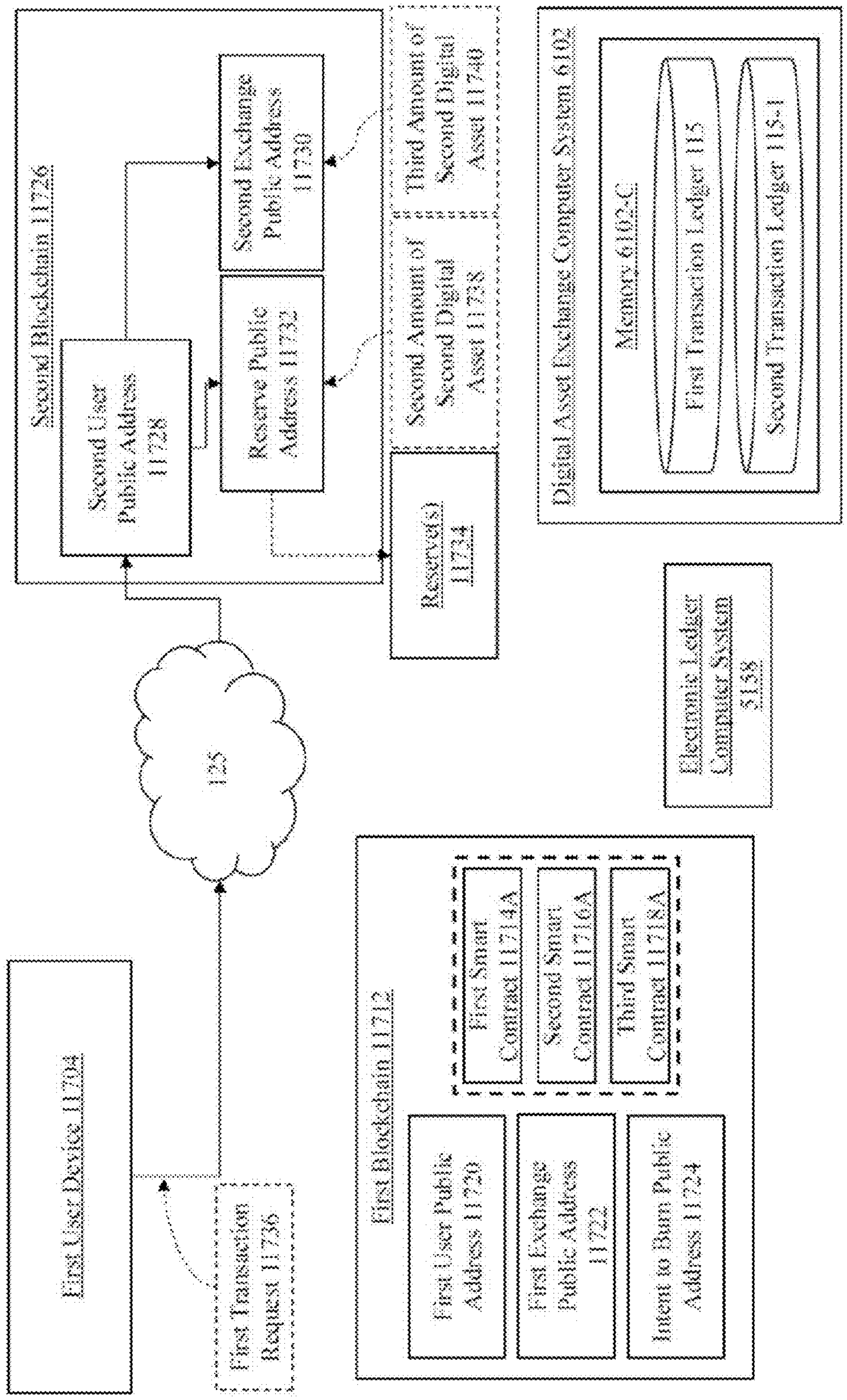
FIG. 1117B-1

T2

T2'

T3'

SYSTEM, METHOD AND PROGRAM PRODUCT FOR GENERATING AND UTILIZING STABLE VALUE DIGITAL ASSETS

The present application is a continuation-in-part of U.S. patent application Ser. No. 16/455,223, filed on Jun. 27, 2019 entitled "SYSTEM, METHOD, AND PROGRAM PRODUCT FOR GENERATING AND UTILIZING STABLE VALUE DIGITAL ASSETS," which in turn is a continuation of U.S. patent application Ser. No. 15/960,040, filed on Apr. 23, 2018 entitled "SYSTEM, METHOD AND PROGRAM PRODUCT FOR GENERATING AND UTILIZING STABLE VALUE DIGITAL ASSETS," which claims priority to and benefit of U.S. Provisional Patent Application Ser. No. 62/660,655, filed on Apr. 20, 2018 entitled "SYSTEM, METHOD AND PROGRAM PRODUCT FOR GENERATING AND UTILIZING STABLE VALUE DIGITAL ASSETS," and also claims priority to and the benefit of U.S. Provisional Patent Application Ser. No. 62/647,353, filed on Mar. 23, 2018 entitled "SYSTEM, METHOD AND PROGRAM PRODUCT FOR GENERATING AND UTILIZING STABLE VALUE DIGITAL ASSETS," and further claims priority to and the benefit of U.S. Provisional Patent Application Ser. No. 62/638,679, filed on Mar. 5, 2018 entitled "SYSTEM, METHOD AND PROGRAM PRODUCT FOR GENERATING AND UTILIZING STABLE VALUE DIGITAL ASSETS," the entire content of each of which is hereby incorporated by reference herein.

This application is also a continuation-in-part of U.S. patent application Ser. No. 16/670,624, filed on Oct. 31, 2019 and entitled "SYSTEM, METHOD AND PROGRAM PRODUCT FOR GENERATING AND UTILIZING STABLE VALUE DIGITAL ASSETS," which is a continuation of U.S. patent application Ser. No. 16/407,426, filed on May 9, 2019, and entitled "SYSTEM, METHOD AND PROGRAM PRODUCT FOR GENERATING AND UTILIZING STABLE VALUE DIGITAL ASSETS," which is a continuation of U.S. patent application Ser. No. 16/020,534, filed Jun. 27, 2018, and entitled "SYSTEM, METHOD AND PROGRAM PRODUCT FOR GENERATING AND UTILIZING STABLE VALUE DIGITAL ASSETS" which is a continuation-in-part of U.S. patent application Ser. No. 15/960,040, filed on Apr. 23, 2018 and entitled "SYSTEM, METHOD AND PROGRAM PRODUCT FOR GENERATING AND UTILIZING STABLE VALUE DIGITAL ASSETS," which claims priority to and the benefit of each of U.S. Provisional Patent Application No. 62/660,655, filed on Apr. 20, 2018 and entitled "SYSTEM, METHOD AND PROGRAM PRODUCT FOR GENERATING AND UTILIZING STABLE VALUE DIGITAL ASSETS," U.S. Provisional Patent Application No. 62/647,353, filed on Mar. 23, 2018 and entitled "SYSTEM, METHOD AND PROGRAM PRODUCT FOR GENERATING AND UTILIZING STABLE VALUE DIGITAL ASSETS," and U.S. Provisional Patent Application No. 62/638,679, filed on Mar. 5, 2018 and entitled "SYSTEM, METHOD AND PROGRAM PRODUCT FOR GENERATING AND UTILIZING STABLE VALUE DIGITAL ASSETS," the entire content of each of which is hereby incorporated by reference herein.

U.S. patent application Ser. No. 16/020,534 also claims the benefit of and priority to U.S. Provisional Patent Application Ser. No. 62/689,563, filed on Jun. 25, 2018 and entitled "SYSTEM, METHOD AND PROGRAM PRODUCT FOR GENERATING AND UTILIZING STABLE VALUE DIGITAL ASSETS" and U.S. Provisional Patent Application No. 62/683,412, filed Jun. 11, 2018 and entitled "SYSTEM, METHOD AND PROGRAM PRODUCT FOR GENERATING AND UTILIZING STABLE VALUE DIGITAL ASSETS", the entire content of each of which is hereby incorporated by reference herein.

This application is also a continuation-in-part of U.S. patent application Ser. No. 17/159,832, filed on Jan. 27, 2021 and entitled "SYSTEM, METHOD, AND PROGRAM PRODUCT FOR MULTI-LEG TRANSACTIONS," which in turn is a continuation-in-part of U.S. patent application Ser. No. 16/455,223, filed on Jun. 27, 2019 and entitled "SYSTEM, METHOD AND PROGRAM PRODUCT FOR GENERATING AND UTILIZING STABLE VALUE DIGITAL ASSETS," which in turn is a continuation of U.S. patent application Ser. No. 15/960,040, filed Apr. 23, 2018 entitled "SYSTEM, METHOD AND PROGRAM PRODUCT FOR GENERATING AND UTILIZING STABLE VALUE DIGITAL ASSETS," which claims priority to and benefit of U.S. Provisional Patent Application Ser. No. 62/660,655, filed Apr. 20, 2018 entitled SYSTEM, METHOD AND PROGRAM PRODUCT FOR GENERATING AND UTILIZING STABLE VALUE DIGITAL ASSETS and also claims priority to and the benefit of U.S. Provisional Patent Application Ser. No. 62/647,353, filed Mar. 23, 2018 entitled SYSTEM, METHOD AND PROGRAM PRODUCT FOR GENERATING AND UTILIZING STABLE VALUE DIGITAL ASSETS and further claims priority to and the benefit of U.S. Provisional Patent Application Ser. No. 62/638,679, filed Mar. 5, 2018 entitled SYSTEM, METHOD AND PROGRAM PRODUCT FOR GENERATING AND UTILIZING STABLE VALUE DIGITAL ASSETS, the entire content of each of which is hereby incorporated by reference herein.

U.S. patent application Ser. No. 17/159,832 is also a continuation-in-part of U.S. patent application Ser. No. 16/687,230, filed on Nov. 18, 2019 and entitled SYSTEM, METHOD AND PROGRAM PRODUCT FOR OBTAINING DIGITAL ASSETS, which is a continuation-in-part of U.S. patent application Ser. No. 16/437,841, filed on Jun. 11, 2019 and entitled SYSTEM, METHOD AND PROGRAM PRODUCT FOR GENERATING AND UTILIZING STABLE VALUE DIGITAL ASSETS, which claims the benefit of and priority to each of U.S. Provisional Application No. 62/683,412, filed on Jun. 11, 2018 and entitled SYSTEM, METHOD AND PROGRAM PRODUCT FOR GENERATING AND UTILIZING STABLE VALUE DIGITAL ASSETS; U.S. Provisional Application No. 62/689,563, filed on Jun. 25, 2018 and entitled SYSTEM, METHOD AND PROGRAM PRODUCT FOR GENERATING AND UTILIZING STABLE VALUE DIGITAL ASSETS; U.S. Provisional Application Ser. No. 62/764,977, filed on Aug. 17, 2018 and entitled SYSTEM, METHOD, AND PROGRAM PRODUCT FOR MODIFYING A SUPPLY OF STABLE VALUE DIGITAL ASSET TOKENS; U.S. Provisional Patent Application Ser. No. 62/721,983, filed on Aug. 23, 2018 and entitled SYSTEM, METHOD, AND PROGRAM PRODUCT FOR MODIFYING A SUPPLY OF STABLE VALUE DIGITAL ASSET TOKENS; and U.S. Provisional Patent Application Ser. No. 62/728,441, filed on Sep. 7, 2018 and entitled SYSTEM, METHOD, AND PROGRAM PRODUCT FOR MODIFYING A SUPPLY OF STABLE VALUE DIGITAL ASSET TOKENS, the entire content of each of which is hereby incorporated by reference herein.

U.S. patent application Ser. No. 16/437,841 is a continuation-in-part of U.S. patent application Ser. No. 16/421,975, filed on May 24, 2019 and entitled SYSTEM, METHOD AND PROGRAM PRODUCT FOR MODIFYING A SUPPLY OF STABLE VALUE DIGITAL ASSET TOKENS, which is a continuation of U.S. patent application Ser. No. 16/293,531, filed on Mar. 5, 2019 and entitled SYSTEM, METHOD AND PROGRAM PRODUCT FOR MODIFYING A SUPPLY OF STABLE VALUE DIGITAL ASSET TOKENS which claims the benefit of and priority to each of U.S. Provisional Application No. 62/638,679, filed on Mar. 5, 2018 and entitled SYSTEM, METHOD AND PROGRAM PRODUCT FOR GENERATING AND UTILIZING STABLE VALUE DIGITAL ASSETS; U.S. Provisional Application No. 62/647,353, filed on Mar. 23, 2018 and entitled SYSTEM, METHOD AND PROGRAM PRODUCT FOR GENERATING AND UTILIZING STABLE VALUE DIGITAL ASSETS; U.S. Provisional Application No. 62/660,655, filed on Apr. 20, 2018 and entitled SYSTEM, METHOD AND PROGRAM PRODUCT FOR GENERATING AND UTILIZING STABLE VALUE DIGITAL ASSETS; U.S. Provisional Application No. 62/683,412, filed on Jun. 11, 2018 and entitled SYSTEM, METHOD AND PROGRAM PRODUCT FOR GENERATING AND UTILIZING STABLE VALUE DIGITAL ASSETS; U.S. Provisional Application No. 62/689,563, filed on Jun. 25, 2018 and entitled SYSTEM, METHOD AND PROGRAM PRODUCT FOR GENERATING AND UTILIZING STABLE VALUE DIGITAL ASSETS; U.S. Provisional Application Ser. No. 62/764,977, filed on Aug. 17, 2018 and entitled SYSTEM, METHOD, AND PROGRAM PRODUCT FOR MODIFYING A SUPPLY OF STABLE VALUE DIGITAL ASSET TOKENS; U.S. Provisional Patent Application Ser. No. 62/721,983, filed on Aug. 23, 2018 and entitled SYSTEM, METHOD, AND PROGRAM PRODUCT FOR MODIFYING A SUPPLY OF STABLE VALUE DIGITAL ASSET TOKENS; and U.S. Provisional Patent Application Ser. No. 62/728,441, filed on Sep. 7, 2018 and entitled SYSTEM, METHOD, AND PROGRAM PRODUCT FOR MODIFYING A SUPPLY OF STABLE VALUE DIGITAL ASSET TOKENS, the entire content of each of which is hereby incorporated by reference herein.

U.S. patent application Ser. No. 16/293,531, filed on Mar. 5, 2019 and entitled SYSTEM, METHOD AND PROGRAM PRODUCT FOR MODIFYING A SUPPLY OF STABLE VALUE DIGITAL ASSET TOKENS also claims priority as a continuation-in-part to U.S. patent application Ser. No. 16/036,469, filed on Jul. 16, 2018 and entitled SYSTEM, METHOD, AND PROGRAM PRODUCT FOR DEPOSITING AND WITHDRAWING STABLE VALUE DIGITAL ASSETS IN EXCHANGE FOR FIAT, which in turn is a continuation-in-part of U.S. patent application Ser. No. 16/020,534, filed on Jun. 27, 2018 and entitled SYSTEM, METHOD, AND PROGRAM PRODUCT FOR GENERATING AND UTILIZING STABLE VALUE DIGITAL ASSETS, which in turn is a continuation-in-part of U.S. patent application Ser. No. 15/960,040, filed on Apr. 23, 2018 and entitled SYSTEM, METHOD AND PROGRAM PRODUCT FOR GENERATING AND UTILIZING STABLE VALUE DIGITAL ASSETS, which claims priority to and the benefit of each of U.S. Provisional Patent Application No. 62/660,655, filed on Apr. 20, 2018 and entitled SYSTEM, METHOD AND PROGRAM PRODUCT FOR GENERATING AND UTILIZING STABLE VALUE DIGITAL ASSETS, U.S. Provisional Patent Application No. 62/647,353, filed on Mar. 23, 2018 and entitled SYSTEM, METHOD AND PROGRAM PRODUCT FOR GENERATING AND UTILIZING STABLE VALUE DIGITAL ASSETS, and U.S. Provisional Patent Application No. 62/638,679, filed on Mar. 5, 2018 and entitled SYSTEM, METHOD AND PROGRAM PRODUCT FOR GENERATING AND UTILIZING STABLE VALUE DIGITAL ASSETS, the entire content of each of which is hereby incorporated by reference herein.

U.S. patent application Ser. No. 16/293,531, filed on Mar. 5, 2019 and entitled SYSTEM, METHOD AND PROGRAM PRODUCT FOR MODIFYING A SUPPLY OF STABLE VALUE DIGITAL ASSET TOKENS also claims priority as a continuation-in-part to U.S. patent application Ser. No. 15/960,040, filed on Apr. 23, 2018 and entitled SYSTEM, METHOD AND PROGRAM PRODUCT FOR GENERATING AND UTILIZING STABLE VALUE DIGITAL ASSETS, which claims priority to and the benefit of each of: U.S. Provisional Patent Application No. 62/660,655, filed on Apr. 20, 2018 and entitled SYSTEM, METHOD AND PROGRAM PRODUCT FOR GENERATING AND UTILIZING STABLE VALUE DIGITAL ASSETS, U.S. Provisional Patent Application No. 62/647,353, filed on Mar. 23, 2018 and entitled SYSTEM, METHOD AND PROGRAM PRODUCT FOR GENERATING AND UTILIZING STABLE VALUE DIGITAL ASSETS, and U.S. Provisional Patent Application No. 62/638,679, filed on Mar. 5, 2018 and entitled SYSTEM, METHOD AND PROGRAM PRODUCT FOR GENERATING AND UTILIZING STABLE VALUE DIGITAL ASSETS, the entire content of each of which is hereby incorporated by reference herein.

U.S. patent application Ser. No. 16/293,531, filed on Mar. 5, 2019 and entitled SYSTEM, METHOD AND PROGRAM PRODUCT FOR MODIFYING A SUPPLY OF STABLE VALUE DIGITAL ASSET TOKENS also claims priority as a continuation-in-part to U.S. patent application Ser. No. 16/020,534 filed on Jun. 27, 2018 and entitled SYSTEM, METHOD, AND PROGRAM PRODUCT FOR GENERATING AND UTILIZING STABLE VALUE DIGITAL ASSETS, which claims the benefit of and priority to each of U.S. Provisional Patent Application Ser. No. 62/689,563, filed on Jun. 25, 2018 and entitled SYSTEM, METHOD AND PROGRAM PRODUCT FOR GENERATING AND UTILIZING STABLE VALUE DIGITAL ASSETS; and U.S. Provisional Patent Application No. 62/683,412, filed Jun. 11, 2018 and entitled SYSTEM, METHOD AND PROGRAM PRODUCT FOR GENERATING AND UTILIZING STABLE VALUE DIGITAL ASSETS, the entire content of each of which is hereby incorporated by reference herein.

U.S. patent application Ser. No. 16/036,469 also claims the benefit of and priority to each of U.S. Provisional Patent Application Ser. No. 62/689,563, filed on Jun. 25, 2018 and entitled SYSTEM, METHOD AND PROGRAM PRODUCT FOR GENERATING AND UTILIZING STABLE VALUE DIGITAL ASSETS; and U.S. Provisional Patent Application No. 62/683,412, filed Jun. 11, 2018 and entitled SYSTEM, METHOD AND PROGRAM PRODUCT FOR GENERATING AND UTILIZING STABLE VALUE DIGITAL ASSETS, the entire content of each of which is hereby incorporated by reference herein.

U.S. patent application Ser. No. 16/293,531, filed on Mar. 5, 2019 and entitled SYSTEM, METHOD AND PROGRAM PRODUCT FOR MODIFYING A SUPPLY OF STABLE VALUE DIGITAL ASSET TOKENS also claims priority as a continuation-in-part to U.S. patent application Ser. No. 16/282,955, filed on Feb. 22, 2019 and entitled SYSTEMS, METHODS, AND PROGRAM PRODUCTS FOR DEPOSITING, HOLDING, AND/OR DISTRIBUTING COLLATERAL AS A TOKEN IN THE FORM OF DIGITAL ASSETS ON AN UNDERLYING BLOCKCHAIN, which in turn is a continuation-in-part to U.S. Non-Provisional patent application Ser. No. 16/280,788, filed Feb. 20, 2019 and entitled SYSTEMS, METHODS, AND PROGRAM PRODUCTS FOR LOANING DIGITAL ASSETS AND FOR DEPOSITING, HOLDING AND/OR DISTRIBUTING COLLATERAL AS A TOKEN IN THE FORM OF DIGITAL ASSETS ON AN UNDERLYING BLOCKCHAIN, which in turn claims priority to U.S. Provisional Application Ser. No. 62/684,023 filed on Jun. 12, 2018 and entitled SYSTEMS, METHODS, AND PROGRAM PRODUCTS FOR LOANING DIGITAL ASSETS; U.S. Provisional Application No. 62/680,775, filed on Jun. 5, 2018 and entitled SYSTEMS, METHODS, AND PROGRAM PRODUCTS FOR LOANING DIGITAL ASSETS; U.S. Provisional Application No. 62/702,265, filed on Jul. 23, 2018 and entitled SYSTEMS, METHODS, AND PROGRAM PRODUCTS FOR LOANING DIGITAL ASSETS AND FOR DEPOSITING, HOLDING, AND/OR DISTRIBUTING COLLATERAL AS A TOKEN ON AN UNDERLYING BLOCKCHAIN; U.S. Provisional Patent Application Ser. No. 62/764,978, filed on Aug. 17, 2018 and entitled SYSTEMS, METHODS, AND PROGRAM PRODUCTS FOR GENERATING USER DEFINED SMART CONTRACTS AND DEPOSITING, HOLDING AND/OR DISTRIBUTING COLLATERAL AS A TOKEN IN THE FORM OF DIGITAL ASSETS ON AN UNDERLYING BLOCKCHAIN, and U.S. Provisional Patent Application Ser. No. 62/732,347, filed on Sep. 17, 2018 and entitled SYSTEMS, METHODS, AND PROGRAM PRODUCTS FOR GENERATING USER DEFINED SMART CONTRACTS AND DEPOSITING, HOLDING AND/OR DISTRIBUTING COLLATERAL AS A TOKEN IN THE FORM OF DIGITAL ASSETS ON AN UNDERLYING BLOCKCHAIN, the entire content of each of each of which is hereby incorporated by reference herein. U.S. Non-Provisional patent application Ser. No. 16/280,788 also claims priority as a continuation-in-part to U.S. Non-Provisional patent application Ser. No. 15/973,140, filed on May 7, 2018 and entitled SYSTEMS, METHODS, AND PROGRAM PRODUCTS FOR EXCHANGING DIGITAL ASSETS FOR FIAT AND/OR OTHER DIGITAL ASSETS, which in turn claims priority to U.S. Provisional Patent Application Ser. No. 62/660,655, filed on Apr. 20, 2018 and entitled SYSTEM, METHOD AND PROGRAM PRODUCT FOR GENERATING AND UTILIZING STABLE VALUE DIGITAL ASSETS, U.S. Provisional Patent Application Ser. No. 62/642,946, filed on Mar. 14, 2018 and entitled SYSTEMS, METHODS, AND PROGRAM PRODUCTS FOR EXCHANGING DIGITAL ASSETS FOR FIAT AND/OR OTHER DIGITAL ASSETS, U.S. Provisional Patent Application Ser. No. 62/642,931, filed on Mar. 14, 2018 and entitled SYSTEMS, METHODS, AND PROGRAM PRODUCTS FOR EXCHANGING DIGITAL ASSETS FOR FIAT AND/OR OTHER DIGITAL ASSETS, and U.S. Provisional Patent Application Ser. No. 62/629,417, filed on Feb. 12, 2018 and entitled SYSTEMS, METHODS, AND PROGRAM PRODUCTS FOR VERIFYING DIGITAL ASSETS HELD IN A CUSTODIAL DIGITAL ASSET WALLET, the entire content of each of which is hereby incorporated by reference herein. U.S. Non-Provisional patent application Ser. No. 16/280,788 also claims priority as a continuation-in-part to U.S. Non-Provisional patent application Ser. No. 15/960,040, filed on Apr. 23, 2018 and entitled SYSTEM, METHOD AND PROGRAM PRODUCT FOR GENERATING AND UTILIZING STABLE VALUE DIGITAL ASSETS, which in turn claims priority to U.S. Provisional Patent Application Ser. No. 62/660,655, filed on Apr. 20, 2018 and entitled SYSTEM, METHOD AND PROGRAM PRODUCT FOR GENERATING AND UTILIZING STABLE VALUE DIGITAL ASSETS, and U.S. Provisional Patent Application Ser. No. 62/647,353, filed on Mar. 23, 2018 and entitled SYSTEM, METHOD AND PROGRAM PRODUCT FOR GENERATING AND UTILIZING STABLE VALUE DIGITAL ASSETS and U.S. Provisional Patent Application Ser. No. 62/638,679, filed on Mar. 5, 2018 and entitled SYSTEM, METHOD AND PROGRAM PRODUCT FOR GENERATING AND UTILIZING STABLE VALUE DIGITAL ASSETS, the entire content of each of which is hereby incorporated by reference herein. U.S. Non-Provisional patent application Ser. No. 16/280,788 also claims priority as a continuation-in-part to U.S. Non-Provisional patent application Ser. No. 15/973,175, filed on May 7, 2018 and entitled SYSTEMS, METHODS, AND PROGRAM PRODUCTS FOR EXCHANGING DIGITAL ASSETS FOR FIAT AND/OR OTHER DIGITAL ASSETS, which in turn claims priority to U.S. Provisional Patent Application No. 62/642,946, filed on Mar. 14, 2018 and entitled SYSTEMS, METHODS, AND PROGRAM PRODUCTS FOR EXCHANGING DIGITAL ASSETS FOR FIAT AND/OR OTHER DIGITAL ASSETS, and U.S. Provisional Patent Application No. 62/642,931 filed on Mar. 14, 2018 and entitled SYSTEMS, METHODS, AND PROGRAM PRODUCTS FOR EXCHANGING DIGITAL ASSETS FOR FIAT AND/OR OTHER DIGITAL ASSETS, and U.S. Provisional Patent Application Ser. No. 62/629,417, filed Feb. 12, 2018 entitled SYSTEMS, METHODS, AND PROGRAM PRODUCTS FOR VERIFYING DIGITAL ASSETS HELD IN A CUSTODIAL DIGITAL ASSET WALLET, and U.S. Provisional Patent Application Ser. No. 62/660,655 filed on Apr. 20, 2018 and entitled SYSTEMS, METHODS, and PROGRAM PRODUCT FOR GENERATING AND UTILIZING STABLE VALUE DIGITAL ASSETS, the entire content of each of which is hereby incorporated by reference herein. U.S. Non-Provisional patent application Ser. No. 16/280,788 also claims priority as a continuation-in-part to U.S. Non-Provisional patent application Ser. No. 15/920,042, filed on Mar. 13, 2018 and entitled SYSTEMS, METHODS, AND PROGRAM PRODUCTS FOR VERIFYING DIGITAL ASSETS HELD IN A CUSTODIAL DIGITAL ASSET WALLET, which in turn claims priority to U.S. Provisional Patent Application No. 62/629,417 filed Feb. 12, 2018 and entitled SYSTEMS, METHODS, AND PROGRAM PRODUCTS FOR VERIFYING DIGITAL ASSETS HELD IN A CUSTODIAL DIGITAL ASSET WALLET, the entire content of each of which is hereby incorporated by reference herein.

U.S. patent application Ser. No. 17/159,832 also claims the benefit of and priority to: U.S. Provisional Patent Application No. 62/981,349, filed on Feb. 25, 2020 and entitled "SYSTEM, METHOD AND PROGRAM PRODUCT FOR MULTI-LEG TRANSACTIONS," U.S. Provisional Patent Application No. 62/966,374, filed on Jan. 27, 2020 and entitled "SYSTEMS, METHODS, AND PROGRAM PRODUCTS FOR NON-CUSTODIAL TRADING OF DIGITAL ASSETS ON A DIGITAL ASSET EXCHANGE," and U.S. Provisional Patent Application No. 62/969,948, filed on Feb. 4, 2020 and entitled "SYSTEMS, METHODS, AND PROGRAM PRODUCTS FOR PROVIDING GOODS AND SERVICES, INCLUDING A VIRTUAL PRIVATE NETWORK AND KNOW YOUR CUSTOMER SERVICES, ON A PEER-TO-PEER NETWORK," the entire contents of which is hereby incorporated by reference herein.

U.S. patent application Ser. No. 17/159,832 is also a continuation-in-part of U.S. patent application Ser. No. 16/550,152, filed on Aug. 23, 2019 and entitled SYSTEM, METHOD AND PROGRAM PRODUCT FOR MODIFYING A SUPPLY OF STABLE VALUE DIGITAL ASSET TOKENS which in turn claims the benefit of and priority to each of U.S. Provisional Patent Application Ser. No. 62/867,091, filed Jul. 29, 2019 and entitled SYSTEMS, METHODS, AND PROGRAM PRODUCTS FOR DEPOSITING, HOLDING AND/OR DISTRIBUTING COLLATERAL AS A TOKEN IN THE FORM OF DIGITAL ASSETS ON AN UNDERLYING BLOCKCHAIN; U.S. Provisional Patent Application Ser. No. 62/721,983, filed on Aug. 23, 2018 and entitled SYSTEM, METHOD, AND PROGRAM PRODUCT FOR MODIFYING A SUPPLY OF STABLE VALUE DIGITAL ASSET TOKENS; U.S. Provisional Patent Application Ser. No. 62/728,441, filed on Sep. 7, 2018 and entitled SYSTEM, METHOD, AND PROGRAM PRODUCT FOR MODIFYING A SUPPLY OF STABLE VALUE DIGITAL ASSET TOKENS; and U.S. Provisional Patent Application Ser. No. 62/732,347, filed on Sep. 17, 2018 and entitled SYSTEMS, METHODS, AND PROGRAM PRODUCTS FOR GENERATING USER DEFINED SMART CONTRACTS AND DEPOSITING, HOLDING AND/OR DISTRIBUTING COLLATERAL AS A TOKEN IN THE FORM OF DIGITAL ASSETS ON AN UNDERLYING BLOCKCHAIN, the entire content of each of which is hereby incorporated by reference herein.

U.S. patent application Ser. No. 16/550,152 is also a continuation-in-part of U.S. patent application Ser. No. 16/452,187, filed on Jun. 25, 2019 and entitled SYSTEM, METHOD AND PROGRAM PRODUCT FOR MAKING PAYMENTS USING FIAT-BACKED DIGITAL ASSETS which claims the benefit of and priority to each of U.S. Provisional Patent Application Ser. No. 62/689,563, filed on Jun. 25, 2018 and entitled SYSTEM, METHOD AND PROGRAM PRODUCT FOR GENERATING AND UTILIZING STABLE VALUE DIGITAL ASSETS; U.S. Provisional Application Ser. No. 62/764,977, filed on Aug. 17, 2018 and entitled SYSTEM, METHOD, AND PROGRAM PRODUCT FOR MODIFYING A SUPPLY OF STABLE VALUE DIGITAL ASSET TOKENS; U.S. Provisional Patent Application Ser. No. 62/721,983, filed on Aug. 23, 2018 and entitled SYSTEM, METHOD, AND PROGRAM PRODUCT FOR MODIFYING A SUPPLY OF STABLE VALUE DIGITAL ASSET TOKENS; and U.S. Provisional Patent Application Ser. No. 62/728,441, filed on Sep. 7, 2018 and entitled SYSTEM, METHOD, AND PROGRAM PRODUCT FOR MODIFYING A SUPPLY OF STABLE VALUE DIGITAL ASSET TOKENS, the entire content of each of which is hereby incorporated by reference herein.

U.S. patent application Ser. No. 16/452,187 is also a continuation-in-part of U.S. Patent application Ser. No. 16/437,841, filed on Jun. 11, 2019 and entitled SYSTEM, METHOD AND PROGRAM PRODUCT FOR GENERATING AND UTILIZING STABLE VALUE DIGITAL ASSETS, which is a continuation-in-part of U.S. patent application Ser. No. 16/421,975, filed on May 24, 2019 and entitled SYSTEM, METHOD AND PROGRAM PRODUCT FOR MODIFYING A SUPPLY OF STABLE VALUE DIGITAL ASSET TOKENS, which is a continuation of U.S. patent application Ser. No. 16/293,531, filed on Mar. 5, 2019 and entitled SYSTEM, METHOD AND PROGRAM PRODUCT FOR MODIFYING A SUPPLY OF STABLE VALUE DIGITAL ASSET TOKENS which claims the benefit of and priority to each of U.S. Provisional Patent Application Ser. No. 62/638,679, filed on Mar. 5, 2018 and entitled SYSTEM, METHOD AND PROGRAM PRODUCT FOR GENERATING AND UTILIZING STABLE VALUE DIGITAL ASSETS; U.S. Provisional Patent Application Ser. No. 62/647,353, filed on Mar. 23, 2018 and entitled SYSTEM, METHOD AND PROGRAM PRODUCT FOR GENERATING AND UTILIZING STABLE VALUE DIGITAL ASSETS; U.S. Provisional Patent Application Ser. No. 62/660,655, filed on Apr. 20, 2018 and entitled SYSTEM, METHOD AND PROGRAM PRODUCT FOR GENERATING AND UTILIZING STABLE VALUE DIGITAL ASSETS; U.S. Provisional Patent Application Ser. No. 62/683,412, filed on Jun. 11, 2018 and entitled SYSTEM, METHOD AND PROGRAM PRODUCT FOR GENERATING AND UTILIZING STABLE VALUE DIGITAL ASSETS; U.S. Provisional Patent Application Ser. No. 62/689,563, filed on Jun. 25, 2018 and entitled SYSTEM, METHOD AND PROGRAM PRODUCT FOR GENERATING AND UTILIZING STABLE VALUE DIGITAL ASSETS; U.S. Provisional Application Ser. No. 62/764,977, filed on Aug. 17, 2018 and entitled SYSTEM, METHOD, AND PROGRAM PRODUCT FOR MODIFYING A SUPPLY OF STABLE VALUE DIGITAL ASSET TOKENS; U.S. Provisional Patent Application Ser. No. 62/721,983, filed on Aug. 23, 2018 and entitled SYSTEM, METHOD, AND PROGRAM PRODUCT FOR MODIFYING A SUPPLY OF STABLE VALUE DIGITAL ASSET TOKENS; and U.S. Provisional Patent Application Ser. No. 62/728,441, filed on Sep. 7, 2018 and entitled SYSTEM, METHOD, AND PROGRAM PRODUCT FOR MODIFYING A SUPPLY OF STABLE VALUE DIGITAL ASSET TOKENS, the entire content of each of which is hereby incorporated by reference herein.

U.S. patent application Ser. No. 16/293,531, filed on Mar. 5, 2019 and entitled SYSTEM, METHOD AND PROGRAM PRODUCT FOR MODIFYING A SUPPLY OF STABLE VALUE DIGITAL ASSET TOKENS also claims priority as a continuation-in-part to U.S. patent application Ser. No. 16/036,469, filed on Jul. 16, 2018 and entitled SYSTEM, METHOD, AND PROGRAM PRODUCT FOR DEPOSITING AND WITHDRAWING STABLE VALUE DIGITAL ASSETS IN EXCHANGE FOR FIAT, which in turn is a continuation-in-part of U.S. patent application Ser. No. 16/020,534, filed on Jun. 27, 2018 and entitled SYSTEM, METHOD, AND PROGRAM PRODUCT FOR GENERATING AND UTILIZING STABLE VALUE DIGITAL ASSETS, which in turn is a continuation-in-part of U.S. patent application Ser. No. 15/960,040, filed on Apr. 23, 2018 and entitled SYSTEM, METHOD AND PROGRAM PRODUCT FOR GENERATING AND UTILIZING STABLE VALUE DIGITAL ASSETS, which claims priority to and the benefit of each of U.S. Provisional Patent Application No. 62/660,655, filed on Apr. 20, 2018 and entitled SYSTEM, METHOD AND PROGRAM PRODUCT FOR GENERATING AND UTILIZING STABLE VALUE DIGITAL ASSETS, U.S. Provisional Patent Application No. 62/647,353, filed on Mar. 23, 2018 and entitled SYSTEM, METHOD AND PROGRAM PRODUCT FOR GENERATING AND UTILIZING STABLE VALUE DIGITAL ASSETS, and U.S. Provisional Patent Application No. 62/638,679, filed on Mar. 5, 2018 and entitled SYSTEM, METHOD AND PROGRAM PRODUCT FOR GENERATING AND UTILIZING STABLE VALUE DIGITAL ASSETS, the entire content of each of which is hereby incorporated by reference herein.

U.S. patent application Ser. No. 16/293,531, filed on Mar. 5, 2019 and entitled SYSTEM, METHOD AND PROGRAM PRODUCT FOR MODIFYING A SUPPLY OF STABLE VALUE DIGITAL ASSET TOKENS also claims priority as a continuation-in-part to U.S. patent application Ser. No. 15/960,040, filed on Apr. 23, 2018 and entitled SYSTEM, METHOD AND PROGRAM PRODUCT FOR GENERATING AND UTILIZING STABLE VALUE DIGITAL ASSETS, which claims priority to and the benefit of each of: U.S. Provisional Patent Application No. 62/660,655, filed on Apr. 20, 2018 and entitled SYSTEM, METHOD AND PROGRAM PRODUCT FOR GENERATING AND UTILIZING STABLE VALUE DIGITAL ASSETS, U.S. Provisional Patent Application No. 62/647,353, filed on Mar. 23, 2018 and entitled SYSTEM, METHOD AND PROGRAM PRODUCT FOR GENERATING AND UTILIZING STABLE VALUE DIGITAL ASSETS, and U.S. Provisional Patent Application No. 62/638,679, filed on Mar. 5, 2018 and entitled SYSTEM, METHOD AND PROGRAM PRODUCT FOR GENERATING AND UTILIZING STABLE VALUE DIGITAL ASSETS, the entire content of each of which is hereby incorporated by reference herein.

U.S. patent application Ser. No. 16/293,531, filed on Mar. 5, 2019 and entitled SYSTEM, METHOD AND PROGRAM PRODUCT FOR MODIFYING A SUPPLY OF STABLE VALUE DIGITAL ASSET TOKENS also claims priority as a continuation-in-part to U.S. patent application Ser. No. 16/020,534 filed on Jun. 27, 2018 and entitled SYSTEM, METHOD, AND PROGRAM PRODUCT FOR GENERATING AND UTILIZING STABLE VALUE DIGITAL ASSETS, which claims the benefit of and priority to each of U.S. Provisional Patent Application Ser. No. 62/689,563, filed on Jun. 25, 2018 and entitled SYSTEM, METHOD AND PROGRAM PRODUCT FOR GENERATING AND UTILIZING STABLE VALUE DIGITAL ASSETS; and U.S. Provisional Patent Application No. 62/683,412, filed Jun. 11, 2018 and entitled SYSTEM, METHOD AND PROGRAM PRODUCT FOR GENERATING AND UTILIZING STABLE VALUE DIGITAL ASSETS, the entire content of each of which is hereby incorporated by reference herein.

U.S. patent application Ser. No. 16/036,469 also claims the benefit of and priority to each of U.S. Provisional Patent Application Ser. No. 62/689,563, filed on Jun. 25, 2018 and entitled SYSTEM, METHOD AND PROGRAM PRODUCT FOR GENERATING AND UTILIZING STABLE VALUE DIGITAL ASSETS; and U.S. Provisional Patent Application No. 62/683,412, filed Jun. 11, 2018 and entitled SYSTEM, METHOD AND PROGRAM PRODUCT FOR GENERATING AND UTILIZING STABLE VALUE DIGITAL ASSETS, the entire content of each of which is hereby incorporated by reference herein.

U.S. patent application Ser. No. 16/293,531, filed on Mar. 5, 2019 and entitled SYSTEM, METHOD AND PROGRAM PRODUCT FOR MODIFYING A SUPPLY OF STABLE VALUE DIGITAL ASSET TOKENS also claims priority as a continuation-in-part to U.S. patent application Ser. No. 16/282,955, filed on Feb. 22, 2019 and entitled SYSTEMS, METHODS, AND PROGRAM PRODUCTS FOR DEPOSITING, HOLDING, AND/OR DISTRIBUTING COLLATERAL AS A TOKEN IN THE FORM OF DIGITAL ASSETS ON AN UNDERLYING BLOCKCHAIN, which in turn is a continuation-in-part to U.S. Non-Provisional patent application Ser. No. 16/280,788, filed Feb. 20, 2019 and entitled SYSTEMS, METHODS, AND PROGRAM PRODUCTS FOR LOANING DIGITAL ASSETS AND FOR DEPOSITING, HOLDING AND/OR DISTRIBUTING COLLATERAL AS A TOKEN IN THE FORM OF DIGITAL ASSETS ON AN UNDERLYING BLOCKCHAIN, which in turn claims priority to U.S. Provisional Application Ser. No. 62/684,023 filed on Jun. 12, 2018 and entitled SYSTEMS, METHODS, AND PROGRAM PRODUCTS FOR LOANING DIGITAL ASSETS; U.S. Provisional Patent Application Ser. No. 62/680,775, filed on Jun. 5, 2018 and entitled SYSTEMS, METHODS, AND PROGRAM PRODUCTS FOR LOANING DIGITAL ASSETS; U.S. Provisional Patent Application Ser. No. 62/702,265, filed on Jul. 23, 2018 and entitled SYSTEMS, METHODS, AND PROGRAM PRODUCTS FOR LOANING DIGITAL ASSETS AND FOR DEPOSITING, HOLDING, AND/OR DISTRIBUTING COLLATERAL AS A TOKEN ON AN UNDERLYING BLOCKCHAIN; U.S. Provisional Patent Application Ser. No. 62/764,978, filed on Aug. 17, 2018 and entitled SYSTEMS, METHODS, AND PROGRAM PRODUCTS FOR GENERATING USER DEFINED SMART CONTRACTS AND DEPOSITING, HOLDING AND/OR DISTRIBUTING COLLATERAL AS A TOKEN IN THE FORM OF DIGITAL ASSETS ON AN UNDERLYING BLOCKCHAIN; and U.S. Provisional Patent Application Ser. No. 62/732,347, filed on Sep. 17, 2018 and entitled SYSTEMS, METHODS, AND PROGRAM PRODUCTS FOR GENERATING USER DEFINED SMART CONTRACTS AND DEPOSITING, HOLDING AND/OR DISTRIBUTING COLLATERAL AS A TOKEN IN THE FORM OF DIGITAL ASSETS ON AN UNDERLYING BLOCKCHAIN, the entire content of each of each of which is hereby incorporated by reference herein. U.S. Non-Provisional patent application Ser. No. 16/280,788 also claims priority as a continuation-in-part to U.S. Non-Provisional patent application Ser. No. 15/973,140, filed on May 7, 2018 and entitled SYSTEMS, METHODS, AND PROGRAM PRODUCTS FOR EXCHANGING DIGITAL ASSETS FOR FIAT AND/OR OTHER DIGITAL ASSETS, which in turn claims priority to U.S. Provisional Patent Application Ser. No. 62/660,655, filed on Apr. 20, 2018 and entitled SYSTEM, METHOD AND PROGRAM PRODUCT FOR GENERATING AND UTILIZING STABLE VALUE DIGITAL ASSETS, U.S. Provisional Patent Application Ser. No. 62/642,946, filed on Mar. 14, 2018 and entitled SYSTEMS, METHODS, AND PROGRAM PRODUCTS FOR EXCHANGING DIGITAL ASSETS FOR FIAT AND/OR OTHER DIGITAL ASSETS, U.S. Provisional Patent Application Ser. No. 62/642,931, filed on Mar. 14, 2018 and entitled SYSTEMS, METHODS, AND PROGRAM PRODUCTS FOR EXCHANGING DIGITAL ASSETS FOR FIAT AND/OR OTHER DIGITAL ASSETS, and U.S. Provisional Patent Application Ser. No. 62/629,417, filed on Feb. 12, 2018 and entitled SYSTEMS, METHODS, AND PROGRAM PRODUCTS FOR VERIFYING DIGITAL ASSETS HELD IN A CUSTODIAL DIGITAL ASSET WALLET, the entire content of each of which is hereby incorporated by reference herein. U.S. Non-Provisional patent application Ser. No. 16/280,788 also claims priority as a continuation-in-part to U.S. Non-Provisional patent application Ser. No. 15/960,040, filed on Apr. 23, 2018 and entitled SYSTEM, METHOD AND PROGRAM PRODUCT FOR GENERATING AND UTILIZING STABLE VALUE DIGITAL ASSETS, which in turn claims priority to U.S. Provisional Patent Application Ser. No. 62/660,655, filed on Apr. 20, 2018 and entitled SYSTEM, METHOD AND PROGRAM PRODUCT FOR GENERATING AND UTILIZING STABLE VALUE DIGITAL ASSETS, and U.S. Provisional Patent Application Ser. No. 62/647,353, filed on Mar. 23, 2018 and entitled SYSTEM, METHOD AND PROGRAM PRODUCT FOR GENERATING AND UTILIZING STABLE VALUE DIGITAL ASSETS and U.S. Provisional Patent Application Ser. No. 62/638,679, filed on Mar. 5, 2018 and entitled SYSTEM, METHOD AND PROGRAM PRODUCT FOR GENERATING AND UTILIZING STABLE VALUE DIGITAL ASSETS, the entire content of each of which is hereby incorporated by reference herein. U.S. Non-Provisional patent application Ser. No. 16/280,788 also claims priority as a continuation-in-part to U.S. Non-Provisional patent application Ser. No. 15/973,175, filed on May 7, 2018 and entitled SYSTEMS, METHODS, AND PROGRAM PRODUCTS FOR EXCHANGING DIGITAL ASSETS FOR FIAT AND/OR OTHER DIGITAL ASSETS, which in turn claims priority to U.S. Provisional Patent Application No. 62/642,946, filed on Mar. 14, 2018 and entitled SYSTEMS, METHODS, AND PROGRAM PRODUCTS FOR EXCHANGING DIGITAL ASSETS FOR FIAT AND/OR OTHER DIGITAL ASSETS, and U.S. Provisional Patent Application No. 62/642,931 filed on Mar. 14, 2018 and entitled SYSTEMS, METHODS, AND PROGRAM PRODUCTS FOR EXCHANGING DIGITAL ASSETS FOR FIAT AND/OR OTHER DIGITAL ASSETS, and U.S. Provisional Patent Application Ser. No. 62/629,417, filed Feb. 12, 2018 entitled SYSTEMS, METHODS, AND PROGRAM PRODUCTS FOR VERIFYING DIGITAL ASSETS HELD IN A CUSTODIAL DIGITAL ASSET WALLET, and U.S. Provisional Patent Application Ser. No. 62/660,655 filed on Apr. 20, 2018 and entitled SYSTEMS, METHODS, and PROGRAM PRODUCT FOR GENERATING AND UTILIZING STABLE VALUE DIGITAL ASSETS, the entire content of each of which is hereby incorporated by reference herein. U.S. Non-Provisional patent application Ser. No. 16/280,788 also claims priority as a continuation-in-part to U.S. Non-Provisional patent application Ser. No. 15/920,042, filed on Mar. 13, 2018 and entitled SYSTEMS, METHODS, AND PROGRAM PRODUCTS FOR VERIFYING DIGITAL ASSETS HELD IN A CUSTODIAL DIGITAL ASSET WALLET, which in turn claims priority to U.S. Provisional Patent Application No. 62/629,417 filed Feb. 12, 2018 and entitled SYSTEMS, METHODS, AND PROGRAM PRODUCTS FOR VERIFYING DIGITAL ASSETS HELD IN A CUSTODIAL DIGITAL ASSET WALLET, the entire content of each of which is hereby incorporated by reference herein.

This application is also a continuation-in-part of U.S. patent application Ser. No. 16/518,660, filed on Jul. 22, 2019 and entitled SYSTEMS, METHODS, AND PROGRAM PRODUCTS FOR MODIFYING THE SUPPLY, DEPOSITING, HOLDING, AND/OR DISTRIBUTING COLLATERAL AS A STABLE VALUE TOKEN IN THE FORM OF DIGITAL ASSETS, which in turn is a continuation-in-part to U.S. patent application Ser. No. 16/452,187, filed on Jun. 25, 2019 and entitled SYSTEM, METHOD AND PROGRAM PRODUCT FOR MAKING PAYMENTS USING FIAT BACKED DIGITAL ASSETS, which claims the benefit of and priority to each of U.S. Provisional Application No. 62/689,563, filed on Jun. 25, 2018 and entitled SYSTEM, METHOD AND PROGRAM PRODUCT FOR GENERATING AND UTILIZING STABLE VALUE DIGITAL ASSETS; U.S. Provisional Application Ser. No. 62/764,977, filed on Aug. 17, 2018 and entitled SYSTEM, METHOD, AND PROGRAM PRODUCT FOR MODIFYING A SUPPLY OF STABLE VALUE DIGITAL ASSET TOKENS; U.S. Provisional Patent Application Ser. No. 62/721,983, filed on Aug. 23, 2018 and entitled SYSTEM, METHOD, AND PROGRAM PRODUCT FOR MODIFYING A SUPPLY OF STABLE VALUE DIGITAL ASSET TOKENS; and U.S. Provisional Patent Application Ser. No. 62/728,441, filed on Sep. 7, 2018 and entitled SYSTEM, METHOD, AND PROGRAM PRODUCT FOR MODIFYING A SUPPLY OF STABLE VALUE DIGITAL ASSET TOKENS, the entire content of each of which is hereby incorporated by reference herein.

This application is also a continuation-in-part of U.S. patent application Ser. No. 16/452,187, filed on Jun. 25, 2019 and entitled SYSTEM, METHOD AND PROGRAM PRODUCT FOR MAKING PAYMENTS USING FIAT BACKED DIGITAL ASSETS, which claims the benefit of and priority to each of U.S. Provisional Application No. 62/689,563, filed on Jun. 25, 2018 and entitled SYSTEM, METHOD AND PROGRAM PRODUCT FOR GENERATING AND UTILIZING STABLE VALUE DIGITAL ASSETS; U.S. Provisional Application Ser. No. 62/764,977, filed on Aug. 17, 2018 and entitled SYSTEM, METHOD, AND PROGRAM PRODUCT FOR MODIFYING A SUPPLY OF STABLE VALUE DIGITAL ASSET TOKENS; U.S. Provisional Patent Application Ser. No. 62/721,983, filed on Aug. 23, 2018 and entitled SYSTEM, METHOD, AND PROGRAM PRODUCT FOR MODIFYING A SUPPLY OF STABLE VALUE DIGITAL ASSET TOKENS; and U.S. Provisional Patent Application Ser. No. 62/728,441, filed on Sep. 7, 2018 and entitled SYSTEM, METHOD, AND PROGRAM PRODUCT FOR MODIFYING A SUPPLY OF STABLE VALUE DIGITAL ASSET TOKENS, the entire content of each of which is hereby incorporated by reference herein..

FIELD

The present invention generally relates to the use of a stable value digital asset to pay dividends or other payments for securities and other financial instruments or investments tied to a blockchain. In embodiments, the present invention relates to specific applications of stable value digital asset tokens tied to a blockchain. In embodiments, the present invention relates to specific applications of cross-blockchain interaction and stable value digital asset tokens.

BACKGROUND

In recent times, using blockchain technology, peer-to-peer networks and/or tokens to track inventory, including potentially, equities or shares in a fund has been a subject of a lot of discussion. Moreover, the use of smart contracts to generate tokens (such as security tokens) on a blockchain have also become the subject of a lot of discussion.

However, current blockchain technology (and other peer-to-peer networks), as implemented, do not have adequate technological solutions to paying interest, dividends, royalties and/or other forms of payouts on such investments in a stable value digital asset, asset-backed digital asset, and/or a fiat-backed digital asset which is tied to the same blockchain and/or peer-to-peer network as security tokens.

Further, current blockchain technology, as implemented, does not have adequate technological solutions to provide for modifying a supply of stable value digital assets, asset-backed digital assets, and/or fiat-backed digital assets in the context of directly printing such digital asset tokens to one or more customers or security token holders.

Accordingly, it would be beneficial to provide a method and system that provide for making payments (interest, dividends, royalties, to name a few) on digital assets that avoid one or more of the problems discussed above.

Accordingly, it would also be beneficial to provide for a method, system and program product that provide for modifying a supply of stable value digital assets and/or fiat-backed digital assets in the context of directly printing such digital asset to one or more customers, or security token holders, using blockchain technology (or other peer-to-peer technology) and thus avoid the problems discussed above.

SUMMARY

An object of embodiments of the present invention is to address technological challenges that currently exist in making payments (such as interest, dividends, royalties or other payments) on digital assets tied to a blockchain technology or other peer-to-peer networks.

An object of the present invention is to address technological challenges that currently exist in modifying a supply of stable value digital asset tokens tied to underlying blockchain technology associated with another digital asset.

This and other objects shall be addressed by embodiments of the present invention as set forth herein.

In embodiments, the present invention generally relates to the use of stable value digital assets and/or fiat-backed digital assets as cryptocurrencies that can be linked to other digital assets using blockchain technology and/or through a peer-to-peer network. In embodiments, the present invention relates to specific applications of fiat-backed digital assets and/or stable value digital asset tokens tied to a peer-to-peer network, such as a blockchain network.

A stable value digital asset token (e.g., SVCoin) is provided which may be pegged to a fiat currency such as USD, Euro, Yen, to name a few. For example, 1 SVCoin will have a net asset value ("NAV") of $1 USD. In embodiments, 100 SVCoins may have a NAV of $1 USD, so that 1 SVCoin has a NAV of 1 penny. Unlike BITCOIN and many other crypto protocols, the SVCoin will not have a natural cap (e.g., 22 million BITCOINs) and, because it is pegged to a fiat currency, it will not fluctuate in value against such fiat currency as is typical of many crypto currencies.

In embodiments, the SVCoin can be issued by a trusted entity, like a digital asset exchange, bank, or other trusted entity using a token on an established blockchain, like ETHER or BITCOIN, and smart contract technology. Thus, for example, a buyer can provide the trusted entity (e.g., digital asset exchange, bank, etc.) with a fixed sum of fiat (e.g., 50 USD) and in return be issued a corresponding fixed sum of SVCoin (e.g., 50 SVCoin). In embodiments, the digital asset exchange can be a regulated trust, such as Gemini Trust Company LLC ("Gemini"). In embodiments, other types of trusted entities (e.g., banks, trusts, etc.) may also be used to issue, administer, redeem, and/or otherwise manage the SVCoin. In embodiments, the trusted entity (digital asset exchange, bank, etc.) can charge a processing fee for issuing the SVCoin either in fiat or in a digital asset, such as the SVCoin. In embodiments, fiat deposited to the trusted entity (e.g., digital asset exchange) is maintained by the trusted entity on par with the amounts deposited. Thus, in embodiments, SVCoin is collateralized by fiat. SVCoin holders can also exchange SVCoin for fiat on the same notional basis with the trusted entity.

An asset-backed digital asset is a digital asset which associated with one or more other assets. Examples of such other assets include one or more types of digital asset, one or more types of fiat, one or more commodity and/or a combination thereof. In embodiments, the asset backed digital asset may be issued by a trusted entity, such as a digital asset exchange, administrator, bank, association, or other trusted entity, which holds or otherwise maintains custody of one or more forms of fiat (e.g., U.S. Dollars, Euros, Yen, Pounds, and/or Chinese Yuan, to name a few), digital asset or other commodity. In embodiments, an asset-backed digital asset is a digital asset may be associated with another digital asset, preferably based on a predetermined ratio of the asset-backed digital asset to the other digital asset or assets. Examples of asset backed digital assets include digital asset security tokens, stable value digital assets, math-based digital assets, fiat, and/or a combination thereof.

A stable value digital asset may be associated with currency. In embodiments the stable value digital asset may be associated with currency based on a predetermined ratio of stable value digital asset to currency. In embodiments the currency may in include one or more fiat. In embodiments, the currency may include one or more cryptocurrencies.

In embodiments, a method may comprise: (a) authenticating, by an administrator computer system associated with an administrator, an access request by a first user device associated with a first user, to the administrator computer system, wherein the administrator computer system is operatively connected to one or more databases which include: i. a first electronic ledger associated with a first digital asset maintained on a first distributed public transaction ledger in the form of a first blockchain that is maintained by a first blockchain network including a first plurality of geographically distributed computer systems in a first peer-to-peer network; ii. a second electronic ledger associated with a second digital asset maintained on a second distributed public transaction ledger in the form of a second blockchain that is maintained by a second blockchain network including a second plurality of geographically distributed computer systems in a second peer-to-peer network, wherein a ratio of second digital asset to first digital asset is a predetermined fixed ratio, and wherein authenticating the access request received from the first user device comprises the steps of: (1) receiving, by the administrator computer system from the first user device, an authentication request including first user credential information associated with the first user; (2) determining, by the administrator computer system, that the first user device is authorized to access the administrator computer system based at least in part on the first user credential information; (3) generating, by the administrator computer system, first machine-executable instructions including first graphical user interface information associated with a first graphical user interface; (4) transmitting, from the administrator computer system to the first user device, the first machine-executable instructions, wherein, upon execution of the first machine-executable instructions, the first user device displays the first graphical user interface; (b) receiving, by the digital asset computer system from the first user device, a first request to, in exchange for a first amount of the first digital asset, obtain a second amount of the second digital asset, comprising the steps of: (1) receiving, by the administrator computer system from the first user device, the first request; (2) verifying, by the administrator computer system, the first request by determining the first user has at least the first amount of the first digital asset based on reference to the first electronic ledger; (3) generating, by the administrator computer system, a first transaction request including first instructions to generate a first designated public address on the first blockchain, wherein the administrator computer system digitally signs the first transaction request with a first private key associated with the administrator; (4) publishing, by the administrator computer system, the first transaction request such that the first plurality of geographically distributed computer systems in the first peer-to-peer network verify the first transaction request and execute the first instructions by generating first designated address information including a first designated key pair associated with a first designated public address on the first blockchain; (5) obtaining, by the administrator computer system based on reference to the first blockchain, first designated address information; (6) generating, by the administrator computer system, a first message including instructions for the first user to transfer the first amount of the first digital asset to the first designated public address on the first blockchain; and (7) sending, by the administrator computer system to the first user device, the first message; (c) confirming, by the administrator computer system based on reference to the first blockchain, a first deposit of the first amount of the first digital asset by performing the steps of: (1) monitoring the first designated public address on the first blockchain; and (2) determining the first amount of the first digital asset was received at the first designated public address; (d) issuing, by the administrator computer system, the second amount of the second digital asset by performing the steps of: (1) generating, by the administrator computer system, a second transaction request including second instructions to: (i) transfer a third amount of the first digital asset from the first designated public address to a reserve public address on the first blockchain; (ii) transfer a fourth amount of the first digital asset from the first designated public address to a first exchange public address [FEES] on the first blockchain, wherein the administrator computer system digitally signs the second transaction request with a second private key associated with the administrator; (2) publishing, by the administrator computer system, the second transaction request such that the first plurality of geographically distributed computer systems in the first peer-to-peer network verify the second transaction request and execute the second instructions; (3) confirming, by the administrator computer system, the second transaction request was executed based on reference to the first blockchain; (4) obtaining, by the administrator computer system, first transaction information based on reference to the first blockchain, the first transaction information indicating the confirmed transfers of the first amount of the first digital asset, the third amount of the first digital asset, and the fourth amount of the first digital asset; (5) updating, by the administrator computer system, the first electronic ledger to account for the second transaction request; (6) generating, by the administrator computer system, a third transaction request including a second message comprising: (i) third instructions to print a fifth amount of the second digital asset to a second designated public address on the second blockchain, wherein the administrator computer system digitally signs the third transaction request with a third private key associated with the administrator, and wherein the fifth amount of the second digital asset is determined based on the predetermined fixed ration of the second digital asset to the first digital asset; and (ii) the first transaction information; and (7) publishing, by the administrator computer system to a first smart contract address on the second blockchain, the third transaction request, wherein the first smart contract address is associated with first smart contract instructions saved as part of the second blockchain and including: (i) verification instructions indicating conditions under which transaction requests published on the second blockchain and addressed to the first smart contract address are verified; and (ii) print instructions indicating conditions under which the second digital asset is issued to one or more public addresses on the second blockchain, wherein the third transaction request is verified in accordance with the verification instructions second designated public address on the second blockchain, and wherein the fifth amount of the second digital asset is printed in accordance with the print instructions; (e) confirming, by the administrator computer system based on reference to the second blockchain, that the third transaction request was executed in accordance with the first smart contract instructions by performing the steps of: (1) monitoring the second designated public address on the second blockchain; and (2) determining the fifth amount of the second digital asset was received at the second designated public address; and (3) updating, by the administrator computer system, the second electronic ledger to account for the fifth amount of the second digital asset being transferred to the second designated public address.

In embodiments, the second blockchain is the Ethereum network.

In embodiments, the first blockchain is the Bitcoin network.

In embodiments, the first blockchain is the Bitcoin Cash network.

In embodiments, the first blockchain is the Stellar network.

In embodiments, the first blockchain is the Filecoin network.

In embodiments, the first blockchain is the Litecoin network.

In embodiments, the first blockchain is the Tezos network.

In embodiments, the first blockchain is the Zcash network.

In embodiments, the first blockchain is the Neo network.

In embodiments, the first blockchain is the Ether Classic network.

In embodiments, the second blockchain is the Neo network.

In embodiments, the second blockchain is the Ether Classic network.

In embodiments, the digital signature is first transaction request include a digital signature generated using at least two private keys associated with the administrator.

In embodiments, the first transaction information comprises information sufficient to indicate a plurality of transactions, including, for each respective transaction: i. respective transaction identification information including a respective transaction identifier associated with the respective transfer of a respective amount of the first digital asset to a respective designated public address; ii. a first respective public address; and iii. a second respective public address.

In embodiments, the first transaction request includes a first plurality of instructions, each associated with generating a respective designated public address associated with depositing the first digital asset, wherein the second transaction request includes a second plurality of instructions, each associated with transferring a respective reserve amount of the first digital asset to the reserve public address and a respective fee amount of the first digital asset to the first exchange public address, and wherein the third transaction request includes a third plurality of instructions, each associated with transferring a respective amount of the second digital asset to a respective digital address on the second blockchain.

In embodiments, the first transaction request is digitally signed with at least two private keys associated with the administrator.

In embodiments, the second transaction request is digitally signed with at least two private keys associated with the administrator.

In embodiments, the third transaction request is digitally signed with at least two private keys associated with the administrator.

In embodiments, the first transaction request is published via a secure channel.

In embodiments, the second transaction request is published via a secure channel.

In embodiments, the third transaction request is published via a secure channel.

In embodiments, the first designated public address is unique to the first user.

In embodiments, the second designated public address is unique to the first user.

In embodiments, conditions under which transaction requests published on the second blockchain are verified in accordance with the verification instructions includes verifying a digital signature associated with published transaction requests such that the verified digital signature is associated with the administrator.

In embodiments, the first transaction information associated with the second transaction request includes an identifier unique to the second transaction request.

In embodiments, the method may further comprise: (m) prior to determining the first amount of the first digital asset was received at the first designated public address, generating third-party monitoring information including the first designated public address; (n) sending, by the administrator computer system to a third-party computer system associated with a third-party, the third-party monitoring information, wherein the third-party computer system monitors the first blockchain for one or more transactions associated with the first designated public address, wherein the third-party computer system determines the first amount of the first digital asset was received at the first designated public address, wherein the third-party computer system obtains the first transaction information, wherein the third-party computer system generates a notification indicating the obtained fist transaction information, and wherein the third-party computer system sends, to the administrator computer system, the generated notification.

In embodiments, wherein the notification is encrypted and sent via a secure channel.

In embodiments, the notification is encrypted by the third-party computer system.

In embodiments, the notification is encrypted communication.

In embodiments, the notification is encrypted using an asymmetric key.

In embodiments, the asymmetric key is a PKI key.

In embodiments, the notification is encrypted using a symmetric key.

In embodiments, the notification is encrypted in accordance with Transport Layer Security protocol.

In embodiments, the notification is encrypted by the administrator computer system.

In embodiments, the authentication request is made by the first user device via a secure channel.

In embodiments, the authentication request is encrypted communication.

In embodiments, the authentication request is encrypted using an asymmetric key.

In embodiments, the asymmetric key is a PKI key.

In embodiments, the authentication request is encrypted using a symmetric key.

In embodiments, the authentication request is encrypted in accordance with Transport Layer Security protocol.

In embodiments, the authentication request is encrypted by the first user device.

In embodiments, the authentication request is encrypted by the administrator computer system.

In embodiments, the first machine-executable instructions are transmitted by the administrator computer system via a secure channel.

In embodiments, the first machine-executable instructions are encrypted communication.

In embodiments, the first machine-executable instructions are encrypted using an asymmetric key.

In embodiments, the asymmetric key is a PKI key.

In embodiments, the first machine-executable instructions are encrypted using a symmetric key.

In embodiments, the first machine-executable instructions are encrypted in accordance with Transport Layer Security protocol.

In embodiments, the first machine-executable instructions are encrypted by the first user device.

In embodiments, the first machine-executable instructions are encrypted by the administrator computer system.

In embodiments, the first request is made by the first user device via a secure channel.

In embodiments, the first request is encrypted communication.

In embodiments, the first request is encrypted using an asymmetric key.

In embodiments, the asymmetric key is a PKI key.

In embodiments, the first request is encrypted using a symmetric key.

In embodiments, the first request is encrypted in accordance with Transport Layer Security protocol.

In embodiments, the first request is encrypted by the first user device.

In embodiments, the first request is encrypted by the administrator computer system.

In embodiments, the first message is sent by the administrator computer system via a secure channel.

In embodiments, the first message is encrypted communication.

In embodiments, the first message is encrypted using an asymmetric key.

In embodiments, the asymmetric key is a PKI key.

In embodiments, the first message is encrypted using a symmetric key.

In embodiments, the first message is encrypted in accordance with Transport Layer Security protocol.

In embodiments, the first message is encrypted by the first user device.

In embodiments, the first message is encrypted by the administrator computer system.

In embodiments, the first transaction request is published via a secure channel.

In embodiments, the second transaction request is published via a secure channel.

In embodiments, the third transaction request is published via a secure channel.

In embodiments, the second blockchain is based on a mathematical protocol for proof of work.

In embodiments, the second blockchain is based on a mathematical protocol for proof of stake.

In embodiments, the second blockchain is based on a cryptographic mathematical protocol.

In embodiments, the method may further comprise a step of publishing, by the administrator computer system to a side ledger, transaction instructions associated with crediting the second amount of the second digital asset and the publishing step (d)(2) includes publishing the transaction instruction from the side ledger to the second distributed public asset ledger periodically or aperiodically.

In embodiments, the first electronic ledger is maintained and stored on the first plurality of geographically distributed computer systems in the first peer-to-peer network in the form of the first blockchain.

In embodiments, the first electronic ledger is maintained on a sidechain, separate from the first blockchain, wherein information on the sidechain is published and stored on the first blockchain periodically or aperiodically.

In embodiments, the second electronic ledger is maintained and stored on the second plurality of geographically distributed computer systems in the second peer-to-peer network in the form of the second blockchain.

In embodiments, the second electronic ledger is maintained on a sidechain, separate from the second blockchain, wherein information on the sidechain is published and stored on the second blockchain periodically or aperiodically.

In embodiments, the first electronic ledger and the second electronic ledger are maintained in separate databases.

In embodiments, the predetermined fixed ratio is one first digital asset for one second digital asset.

In embodiments, the predetermined fixed ratio is 100 first digital asset for one second digital asset.

In embodiments, a method may comprise the steps of: (a) authenticating, by a digital asset exchange computer system associated with a digital asset exchange, an access request by a first user device associated with a first user, to the digital asset exchange computer system, wherein the digital asset exchange computer system is operatively connected to one or more databases which include: i. a first electronic ledger associated with a first digital asset maintained on a first distributed public transaction ledger in the form of a first blockchain that is maintained by a first blockchain network including a first plurality of geographically distributed computer systems in a first peer-to-peer network; ii. a second electronic ledger associated with a second digital asset maintained on a second distributed public transaction ledger in the form of a second blockchain that is maintained by a second blockchain network including a second plurality of geographically distributed computer systems in a second peer-to-peer network, wherein a ratio of second digital asset to first digital asset is a predetermined fixed ratio, and wherein authenticating the access request received from the first user device comprises the steps of: (1) receiving, by the digital asset exchange computer system from the first user device, an authentication request including first user credential information associated with the first user; (2) determining, by the digital asset exchange computer system, that the first user device is authorized to access the digital asset exchange computer system based at least in part on the first user credential information; (3) generating, by the digital asset exchange computer system, first machine-executable instructions including first graphical user interface information associated with a first graphical user interface; (4) transmitting, from the digital asset exchange computer system to the first user device, the first machine-executable instructions, wherein, upon execution of the first machine-executable instructions, the first user device displays the first graphical user interface; (b) receiving, by the digital asset computer system from the first user device, a first request to, in exchange for a first amount of the first digital asset, obtain a second amount of the second digital asset, comprising the steps of: (1) receiving, by the digital asset exchange computer system from the first user device, the first request; (2) verifying, by the digital asset exchange computer system, the first request by determining the first user has at least the first amount of the first digital asset based on reference to the first electronic ledger; (3) generating, by the digital asset exchange computer system, a first transaction request including first instructions to generate a first designated public address on the first blockchain, wherein the digital asset exchange computer system digitally signs the first transaction request with a first private key associated with the digital asset exchange; (4) publishing, by the digital asset exchange computer system, the first transaction request such that the first plurality of geographically distributed computer systems in the first peer-to-peer network verify the first transaction request and execute the first instructions by generating first designated address information including a first designated key pair associated with a first designated public address on the first blockchain; (5) obtaining, by the digital asset exchange computer system based on reference to the first blockchain, first designated address information; (6) generating, by the digital asset exchange computer system, a first message including instructions for the first user to transfer the first amount of the first digital asset to the first designated public address on the first blockchain; and (7)sending, by the digital asset exchange computer system to the first user device, the first message; (c) confirming, by the digital asset exchange computer system based on reference to the first blockchain, a first deposit of the first amount of the first digital asset by performing the steps of: (1) monitoring the first designated public address on the first blockchain; and (2) determining the first amount of the first digital asset was received at the first designated public address; (d) issuing, by the digital asset exchange computer system, the second amount of the second digital asset by performing the steps of: (1) generating, by the digital asset exchange computer system, a second transaction request including second instructions to: (i) transfer a third amount of the first digital asset from the first designated public address to a reserve public address on the first blockchain; (ii) transfer a fourth amount of the first digital asset from the first designated public address to a first exchange public address on the first blockchain, wherein the digital asset exchange computer system digitally signs the second transaction request with a second private key associated with the digital asset exchange; (2) publishing, by the digital asset exchange computer system, the second transaction request such that the first plurality of geographically distributed computer systems in the first peer-to-peer network verify the second transaction request and execute the second instructions; (3) confirming, by the digital asset exchange computer system, the second transaction request was executed based on reference to the first blockchain; (4) obtaining, by the digital asset exchange computer system, first transaction information based on reference to the first blockchain, the first transaction information indicating the confirmed transfers of the first amount of the first digital asset, the third amount of the first digital asset, and the fourth amount of the first digital asset; (5) updating, by the digital asset exchange computer system, the first electronic ledger to account for the second transaction request; (6) generating, by the digital asset exchange computer system, a third transaction request including a second message comprising: (i) third instructions to print a fifth amount of the second digital asset to a second designated public address on the second blockchain, wherein the digital asset exchange computer system digitally signs the third transaction request with a third private key associated with the digital asset exchange, and wherein the fifth amount of the second digital asset is determined based on the predetermined fixed ration of the second digital asset to the first digital asset; and (ii) the first transaction information; and (7) publishing, by the digital asset exchange computer system to a first smart contract address on the second blockchain, the third transaction request, wherein the first smart contract address is associated with first smart contract instructions saved as part of the second blockchain and including: (i) verification instructions indicating conditions under which transaction requests published on the second blockchain and addressed to the first smart contract address are verified; and (ii) print instructions indicating conditions under which the second digital asset is issued to one or more public addresses on the second blockchain, wherein the third transaction request is verified in accordance with the verification instructions second designated public address on the second blockchain, and wherein the fifth amount of the second digital asset is printed in accordance with the print instructions; (e) confirming, by the digital asset exchange computer system based on reference to the second blockchain, that the third transaction request was executed in accordance with the first smart contract instructions by performing the steps of: (1) monitoring the second designated public address on the second blockchain; and (2) determining the fifth amount of the second digital asset was received at the second designated public address; and (3) updating, by the digital asset exchange computer system, the second electronic ledger to account for the fifth amount of the second digital asset being transferred to the second designated public address.

In embodiments, the second blockchain is the Ethereum network.

In embodiments, the first blockchain is the Bitcoin network.

In embodiments, the first blockchain is the Bitcoin Cash network.

In embodiments, the first blockchain is the Stellar network.

In embodiments, the first blockchain is the Filecoin network.

In embodiments, the first blockchain is the Litecoin network.

In embodiments, the first blockchain is the Tezos network.

In embodiments, the first blockchain is the Zcash network.

In embodiments, the first blockchain is the Neo network.

In embodiments, the first blockchain is the Ether Classic network.

In embodiments, the second blockchain is the Neo network.

In embodiments, the second blockchain is the Ether Classic network.

In embodiments, the digital signature is first transaction request include a digital signature generated using at least two private keys associated with the digital asset exchange.

In embodiments, the first transaction information comprises information sufficient to indicate a plurality of transactions, including, for each respective transaction: i. respective transaction identification information including a respective transaction identifier associated with the respective transfer of a respective amount of the first digital asset to a respective designated public address; ii. a first respective public address; and iii. a second respective public address.

In embodiments, the first transaction request includes a first plurality of instructions, each associated with generating a respective designated public address associated with depositing the first digital asset, wherein the second transaction request includes a second plurality of instructions, each associated with transferring a respective reserve amount of the first digital asset to the reserve public address and a respective fee amount of the first digital asset to the first exchange public address, and wherein the third transaction request includes a third plurality of instructions, each associated with transferring a respective amount of the second digital asset to a respective digital address on the second blockchain.

In embodiments, the first transaction request is digitally signed with at least two private keys associated with the digital asset exchange.

In embodiments, the second transaction request is digitally signed with at least two private keys associated with the digital asset exchange.

In embodiments, the third transaction request is digitally signed with at least two private keys associated with the digital asset exchange.

In embodiments, the first transaction request is published via a secure channel.

In embodiments, the second transaction request is published via a secure channel.

In embodiments, the third transaction request is published via a secure channel.

In embodiments, the first designated public address is unique to the first user.

In embodiments, the second designated public address is unique to the first user.

In embodiments, conditions under which transaction requests published on the second blockchain are verified in accordance with the verification instructions includes verifying a digital signature associated with published transaction requests such that the verified digital signature is associated with the digital asset exchange.

In embodiments, the first transaction information associated with the second transaction request includes an identifier unique to the second transaction request.

In embodiments, the method may further comprise: (m) prior to determining the first amount of the first digital asset was received at the first designated public address, generating third-party monitoring information including the first designated public address; (n) sending, by the digital asset exchange computer system to a third-party computer system associated with a third-party, the third-party monitoring information, wherein the third-party computer system monitors the first blockchain for one or more transactions associated with the first designated public address, wherein the third-party computer system determines the first amount of the first digital asset was received at the first designated public address, wherein the third-party computer system obtains the first transaction information, wherein the third-party computer system generates a notification indicating the obtained fist transaction information, and wherein the third-party computer system sends, to the digital asset exchange computer system, the generated notification.

In embodiments, the notification is encrypted and sent via a secure channel.

In embodiments, the notification is encrypted by the third-party computer system.

In embodiments, the notification is encrypted communication.

In embodiments, the notification is encrypted using an asymmetric key.

In embodiments, the asymmetric key is a PKI key.

In embodiments, the notification is encrypted using a symmetric key.

In embodiments, the notification is encrypted in accordance with Transport Layer Security protocol.

In embodiments, the notification is encrypted by the digital asset exchange computer system.

In embodiments, the authentication request is made by the first user device via a secure channel.

In embodiments, the authentication request is encrypted communication.

In embodiments, the authentication request is encrypted using an asymmetric key.

In embodiments, the asymmetric key is a PKI key.

In embodiments, the authentication request is encrypted using a symmetric key.

In embodiments, the authentication request is encrypted in accordance with Transport Layer Security protocol.

In embodiments, the authentication request is encrypted by the first user device.

In embodiments, the authentication request is encrypted by the digital asset exchange computer system.

In embodiments, the first machine-executable instructions are transmitted by the digital asset exchange computer system via a secure channel.

In embodiments, the first machine-executable instructions are encrypted communication.

In embodiments, the first machine-executable instructions are encrypted using an asymmetric key.

In embodiments, the asymmetric key is a PKI key.

In embodiments, the first machine-executable instructions are encrypted using a symmetric key.

In embodiments, the first machine-executable instructions are encrypted in accordance with Transport Layer Security protocol.

In embodiments, the first machine-executable instructions are encrypted by the first user device.

In embodiments, the first machine-executable instructions are encrypted by the digital asset exchange computer system.

In embodiments, the first request is made by the first user device via a secure channel.

In embodiments, the first request is encrypted communication.

In embodiments, the first request is encrypted using an asymmetric key.

In embodiments, the asymmetric key is a PKI key.

In embodiments, the first request is encrypted using a symmetric key.

In embodiments, the first request is encrypted in accordance with Transport Layer Security protocol.

In embodiments, the first request is encrypted by the first user device.

In embodiments, the first request is encrypted by the digital asset exchange computer system.

In embodiments, the first message is sent by the digital asset exchange computer system via a secure channel.

In embodiments, the first message is encrypted communication.

In embodiments, the first message is encrypted using an asymmetric key.

In embodiments, the asymmetric key is a PKI key.

In embodiments, the first message is encrypted using a symmetric key.

In embodiments, the first message is encrypted in accordance with Transport Layer Security protocol.

In embodiments, the first message is encrypted by the first user device.

In embodiments, the first message is encrypted by the digital asset exchange computer system.

In embodiments, the first transaction request is published via a secure channel.

In embodiments, the second transaction request is published via a secure channel.

In embodiments, the third transaction request is published via a secure channel.

In embodiments, the second blockchain is based on a mathematical protocol for proof of work.

In embodiments, the second blockchain is based on a mathematical protocol for proof of stake.

In embodiments, the second blockchain is based on a cryptographic mathematical protocol.

In embodiments, the method may further comprise a step of publishing, by the digital asset exchange computer system to a side ledger, transaction instructions associated with crediting the second amount of the second digital asset and the publishing step (d)(2) includes publishing the transaction instruction from the side ledger to the second distributed public asset ledger periodically or aperiodically.

In embodiments, the first electronic ledger is maintained and stored on the first plurality of geographically distributed computer systems in the first peer-to-peer network in the form of the first blockchain.

In embodiments, the first electronic ledger is maintained on a sidechain, separate from the first blockchain, wherein information on the sidechain is published and stored on the first blockchain periodically or aperiodically.

In embodiments, the second electronic ledger is maintained and stored on the second plurality of geographically distributed computer systems in the second peer-to-peer network in the form of the second blockchain.

In embodiments, the second electronic ledger is maintained on a sidechain, separate from the second blockchain, wherein information on the sidechain is published and stored on the second blockchain periodically or aperiodically.

In embodiments, the first electronic ledger and the second electronic ledger are maintained in separate databases.

In embodiments, the predetermined fixed ratio is one first digital asset for one second digital asset.

In embodiments, the predetermined fixed ratio is 100 first digital asset for one second digital asset.

In embodiments, a method may comprise the steps of: (a) authenticating, by a digital asset token issuer computer system associated with a digital asset token issuer, an access request by a first user device associated with a first user, to the digital asset token issuer computer system, wherein the digital asset token issuer computer system is operatively connected to one or more databases which include: i. a first electronic ledger associated with a first digital asset maintained on a first distributed public transaction ledger in the form of a first blockchain that is maintained by a first blockchain network including a first plurality of geographically distributed computer systems in a first peer-to-peer network; ii. a second electronic ledger associated with a second digital asset maintained on a second distributed public transaction ledger in the form of a second blockchain that is maintained by a second blockchain network including a second plurality of geographically distributed computer systems in a second peer-to-peer network, wherein a ratio of second digital asset to first digital asset is a predetermined fixed ratio, and wherein authenticating the access request received from the first user device comprises the steps of: (1) receiving, by the digital asset token issuer computer system from the first user device, an authentication request including first user credential information associated with the first user; (2) determining, by the digital asset token issuer computer system, that the first user device is authorized to access the digital asset token issuer computer system based at least in part on the first user credential information; (3)

generating, by the digital asset token issuer computer system, first machine-executable instructions including first graphical user interface information associated with a first graphical user interface; (4) transmitting, from the digital asset token issuer computer system to the first user device, the first machine-executable instructions, wherein, upon execution of the first machine-executable instructions, the first user device displays the first graphical user interface; (b) receiving, by the digital asset computer system from the first user device, a first request to, in exchange for a first amount of the first digital asset, obtain a second amount of the second digital asset, comprising the steps of: (1) receiving, by the digital asset token issuer computer system from the first user device, the first request; (2) verifying, by the digital asset token issuer computer system, the first request by determining the first user has at least the first amount of the first digital asset based on reference to the first electronic ledger; (3) generating, by the digital asset token issuer computer system, a first transaction request including first instructions to generate a first designated public address on the first blockchain, wherein the digital asset token issuer computer system digitally signs the first transaction request with a first private key associated with the digital asset token issuer; (4) publishing, by the digital asset token issuer computer system, the first transaction request such that the first plurality of geographically distributed computer systems in the first peer-to-peer network verify the first transaction request and execute the first instructions by generating first designated address information including a first designated key pair associated with a first designated public address on the first blockchain; (5) obtaining, by the digital asset token issuer computer system based on reference to the first blockchain, first designated address information; (6) generating, by the digital asset token issuer computer system, a first message including instructions for the first user to transfer the first amount of the first digital asset to the first designated public address on the first blockchain; and (7) sending, by the digital asset token issuer computer system to the first user device, the first message; (c) confirming, by the digital asset token issuer computer system based on reference to the first blockchain, a first deposit of the first amount of the first digital asset by performing the steps of: (1) monitoring the first designated public address on the first blockchain; and (2) determining the first amount of the first digital asset was received at the first designated public address; (d) issuing, by the digital asset token issuer computer system, the second amount of the second digital asset by performing the steps of: (1) generating, by the digital asset token issuer computer system, a second transaction request including second instructions to: (i) transfer a third amount of the first digital asset from the first designated public address to a reserve public address on the first blockchain; (ii) transfer a fourth amount of the first digital asset from the first designated public address to a first exchange public address on the first blockchain, wherein the digital asset token issuer computer system digitally signs the second transaction request with a second private key associated with the digital asset token issuer; (2) publishing, by the digital asset token issuer computer system, the second transaction request such that the first plurality of geographically distributed computer systems in the first peer-to-peer network verify the second transaction request and execute the second instructions; (3) confirming, by the digital asset token issuer computer system, the second transaction request was executed based on reference to the first blockchain; (4) obtaining, by the digital asset token issuer computer system, first transaction information based on reference to the first blockchain, the first transaction information indicating the confirmed transfers of the first amount of the first digital asset, the third amount of the first digital asset, and the fourth amount of the first digital asset; (5) updating, by the digital asset token issuer computer system, the first electronic ledger to account for the second transaction request; (6) generating, by the digital asset token issuer computer system, a third transaction request including a second message comprising: (i) third instructions to print a fifth amount of the second digital asset to a second designated public address on the second blockchain, wherein the digital asset token issuer computer system digitally signs the third transaction request with a third private key associated with the digital asset token issuer, and wherein the fifth amount of the second digital asset is determined based on the predetermined fixed ration of the second digital asset to the first digital asset; and (ii) the first transaction information; and (7) publishing, by the digital asset token issuer computer system to a first smart contract address on the second blockchain, the third transaction request, wherein the first smart contract address is associated with first smart contract instructions saved as part of the second blockchain and including: (i) verification instructions indicating conditions under which transaction requests published on the second blockchain and addressed to the first smart contract address are verified; and (ii) print instructions indicating conditions under which the second digital asset is issued to one or more public addresses on the second blockchain, wherein the third transaction request is verified in accordance with the verification instructions second designated public address on the second blockchain, and wherein the fifth amount of the second digital asset is printed in accordance with the print instructions; (e) confirming, by the digital asset token issuer computer system based on reference to the second blockchain, that the third transaction request was executed in accordance with the first smart contract instructions by performing the steps of: (1) monitoring the second designated public address on the second blockchain; and (2) determining the fifth amount of the second digital asset was received at the second designated public address; and (3) updating, by the digital asset token issuer computer system, the second electronic ledger to account for the fifth amount of the second digital asset being transferred to the second designated public address.

In embodiments, the second blockchain is the Ethereum network.

In embodiments, the first blockchain is the Bitcoin network.

In embodiments, the first blockchain is the Bitcoin Cash network.

In embodiments, the first blockchain is the Stellar network.

In embodiments, the first blockchain is the Filecoin network.

In embodiments, the first blockchain is the Litecoin network.

In embodiments, the first blockchain is the Tezos network.

In embodiments, the first blockchain is the Zcash network.

In embodiments, the first blockchain is the Neo network.

In embodiments, the first blockchain is the Ether Classic network.

In embodiments, the second blockchain is the Neo network.

In embodiments, the second blockchain is the Ether Classic network.

In embodiments, the digital signature is first transaction request include a digital signature generated using at least two private keys associated with the digital asset token issuer.

In embodiments, the first transaction information comprises information sufficient to indicate a plurality of transactions, including, for each respective transaction: i. respective transaction identification information including a respective transaction identifier associated with the respective transfer of a respective amount of the first digital asset to a respective designated public address; ii. a first respective public address; and iii. a second respective public address.

In embodiments, the first transaction request includes a first plurality of instructions, each associated with generating a respective designated public address associated with depositing the first digital asset, wherein the second transaction request includes a second plurality of instructions, each associated with transferring a respective reserve amount of the first digital asset to the reserve public address and a respective fee amount of the first digital asset to the first exchange public address, and wherein the third transaction request includes a third plurality of instructions, each associated with transferring a respective amount of the second digital asset to a respective digital address on the second blockchain.

In embodiments, the first transaction request is digitally signed with at least two private keys associated with the digital asset token issuer.

In embodiments, the second transaction request is digitally signed with at least two private keys associated with the digital asset token issuer.

In embodiments, the third transaction request is digitally signed with at least two private keys associated with the digital asset token issuer.

In embodiments, the first transaction request is published via a secure channel.

In embodiments, the second transaction request is published via a secure channel.

In embodiments, the third transaction request is published via a secure channel.

In embodiments, the first designated public address is unique to the first user.

In embodiments, the second designated public address is unique to the first user.

In embodiments, conditions under which transaction requests published on the second blockchain are verified in accordance with the verification instructions includes verifying a digital signature associated with published transaction requests such that the verified digital signature is associated with the digital asset token issuer.

In embodiments, the first transaction information associated with the second transaction request includes an identifier unique to the second transaction request.

In embodiments, the method may further comprise: (m) prior to determining the first amount of the first digital asset was received at the first designated public address, generating third-party monitoring information including the first designated public address; (n) sending, by the digital asset token issuer computer system to a third-party computer system associated with a third-party, the third-party monitoring information, wherein the third-party computer system monitors the first blockchain for one or more transactions associated with the first designated public address, wherein the third-party computer system determines the first amount of the first digital asset was received at the first designated public address, wherein the third-party computer system obtains the first transaction information, wherein the third-party computer system generates a notification indicating the obtained fist transaction information, and wherein the third-party computer system sends, to the digital asset token issuer computer system, the generated notification.

In embodiments, the notification is encrypted and sent via a secure channel.

In embodiments, the notification is encrypted by the third-party computer system.

In embodiments, the notification is encrypted communication.

In embodiments, the notification is encrypted using an asymmetric key.

In embodiments, the asymmetric key is a PKI key.

In embodiments, the notification is encrypted using a symmetric key.

In embodiments, the notification is encrypted in accordance with Transport Layer Security protocol.

In embodiments, the notification is encrypted by the digital asset token issuer computer system.

In embodiments, the authentication request is made by the first user device via a secure channel.

In embodiments, the authentication request is encrypted communication.

In embodiments, the authentication request is encrypted using an asymmetric key.

In embodiments, the asymmetric key is a PKI key.

In embodiments, the authentication request is encrypted using a symmetric key.

In embodiments, the authentication request is encrypted in accordance with Transport Layer Security protocol.

In embodiments, the authentication request is encrypted by the first user device.

In embodiments, the authentication request is encrypted by the digital asset token issuer computer system.

In embodiments, the first machine-executable instructions are transmitted by the digital asset token issuer computer system via a secure channel.

In embodiments, the first machine-executable instructions are encrypted communication.

In embodiments, the first machine-executable instructions are encrypted using an asymmetric key.

In embodiments, the asymmetric key is a PKI key.

In embodiments, the first machine-executable instructions are encrypted using a symmetric key.

In embodiments, the first machine-executable instructions are encrypted in accordance with Transport Layer Security protocol.

In embodiments, the first machine-executable instructions are encrypted by the first user device.

In embodiments, the first machine-executable instructions are encrypted by the digital asset token issuer computer system.

In embodiments, the first request is made by the first user device via a secure channel.

In embodiments, the first request is encrypted communication.

In embodiments, the first request is encrypted using an asymmetric key.

In embodiments, the asymmetric key is a PKI key.

In embodiments, the first request is encrypted using a symmetric key.

In embodiments, the first request is encrypted in accordance with Transport Layer Security protocol.

In embodiments, the first request is encrypted by the first user device.

In embodiments, the first request is encrypted by the digital asset token issuer computer system.

In embodiments, the first message is sent by the digital asset token issuer computer system via a secure channel.

In embodiments, the first message is encrypted communication.

In embodiments, the first message is encrypted using an asymmetric key.

In embodiments, the asymmetric key is a PKI key.

In embodiments, the first message is encrypted using a symmetric key.

In embodiments, the first message is encrypted in accordance with Transport Layer Security protocol.

In embodiments, the first message is encrypted by the first user device.

In embodiments, the first message is encrypted by the digital asset token issuer computer system.

In embodiments, the first transaction request is published via a secure channel.

In embodiments, the second transaction request is published via a secure channel.

In embodiments, the third transaction request is published via a secure channel.

In embodiments, the second blockchain is based on a mathematical protocol for proof of work.

In embodiments, the second blockchain is based on a mathematical protocol for proof of stake.

In embodiments, the second blockchain is based on a cryptographic mathematical protocol.

In embodiments, the method may further comprise a step of publishing, by the digital asset token issuer computer system to a side ledger, transaction instructions associated with crediting the second amount of the second digital asset and the publishing step (d)(2) includes publishing the transaction instruction from the side ledger to the second distributed public asset ledger periodically or aperiodically.

In embodiments, the first electronic ledger is maintained and stored on the first plurality of geographically distributed computer systems in the first peer-to-peer network in the form of the first blockchain.

In embodiments, the first electronic ledger is maintained on a sidechain, separate from the first blockchain, wherein information on the sidechain is published and stored on the first blockchain periodically or aperiodically.

In embodiments, the second electronic ledger is maintained and stored on the second plurality of geographically distributed computer systems in the second peer-to-peer network in the form of the second blockchain.

In embodiments, the second electronic ledger is maintained on a sidechain, separate from the second blockchain, wherein information on the sidechain is published and stored on the second blockchain periodically or aperiodically.

In embodiments, the first electronic ledger and the second electronic ledger are maintained in separate databases.

In embodiments, the predetermined fixed ratio is one first digital asset for one second digital asset.

In embodiments, the predetermined fixed ratio is 100 first digital asset for one second digital asset.

In embodiments, a method may comprise the steps of: (a) authenticating, by an administrator computer system associated with an administrator, an access request by a first user device associated with a first user, to the administrator computer system, wherein the administrator computer system is operatively connected to one or more databases which include: i. a first electronic ledger associated with a first digital asset maintained on a first distributed public transaction ledger in the form of a first blockchain that is maintained by a first blockchain network including a first plurality of geographically distributed computer systems in a first peer-to-peer network; ii. a second electronic ledger associated with a second digital asset maintained on a second distributed public transaction ledger in the form of a second blockchain that is maintained by a second blockchain network including a second plurality of geographically distributed computer systems in a second peer-to-peer network, wherein a ratio of second digital asset to first digital asset is a predetermined fixed ratio, and wherein authenticating the access request received from the first user device comprises the steps of: (1) receiving, by the administrator computer system from the first user device, an authentication request including first user credential information associated with the first user; (2) determining, by the administrator computer system, that the first user device is authorized to access the administrator computer system based at least in part on the first user credential information; (3) generating, by the administrator computer system, first machine-executable instructions including first graphical user interface information associated with a first graphical user interface; (4) transmitting, from the administrator computer system to the first user device, the first machine-executable instructions, wherein, upon execution of the first machine-executable instructions, the first user device displays the first graphical user interface; (b) receiving, by the digital asset computer system from the first user device, a first request to obtain a first amount of the first digital asset in exchange for a second amount of the second digital asset, comprising the steps of: (1) receiving, by the administrator computer system from the first user device, the first request; (2) verifying, by the administrator computer system, the first request by determining the first user has at least the second amount of the second digital asset based on reference to the second electronic ledger; (3) generating, by the administrator computer system, a first transaction request including first instructions to generate a first designated public address on the second blockchain, wherein the administrator computer system digitally signs the first transaction request with a first private key associated with the administrator; (4) publishing, by the administrator computer system, the first transaction request such that the second plurality of geographically distributed computer systems in the second peer-to-peer network verify the first transaction request and execute the first instructions by generating first designated address information including a first designated key pair associated with a first designated public address on the second blockchain; (5) obtaining, by the administrator computer system based on reference to the second blockchain, first designated address information; (6) generating, by the administrator computer system, a first message including instructions for the first user to transfer the second amount of the second digital asset to the first designated public address on the second blockchain; and (7) sending, by the administrator computer system to the first user device, the first message; (c) confirming, by the administrator computer system based on reference to the second blockchain, a first deposit of the second amount of the second digital asset by performing the steps of: (1) monitoring the first designated public address on the second blockchain; and (2) determining the second amount of the second digital asset was received at the first designated public address; (d) issuing, by the administrator computer system, the first amount of the first digital asset by performing the steps of: (1) generating, by the administrator computer system, a second transaction request including a second message comprising second instructions to: (i) transfer the second amount of the second digital asset from the first designated public address to a first smart contract address on the second blockchain; and (ii)

burn the second amount of the second digital asset; wherein the first smart contract address is associated with first smart contract instructions saved as part of the second blockchain and including: (i) verification instructions indicating conditions under which transaction requests published on the second blockchain and addressed to the first smart contract address are verified; and (ii) burn instructions indicating conditions under which the second digital asset is burned, and wherein the administrator computer system digitally signs the second transaction request with a second private key associated with the administrator; (2) publishing, by the administrator computer system to the first smart contract address on the second blockchain, the second transaction; (3) confirming, by the administrator computer system, the second transaction request was executed based on reference to the second blockchain; (4) updating, by the administrator computer system, the second electronic ledger to account for the second transaction request; (5) generating, by the administrator computer system, a third transaction request including third instructions to: (i) transfer a third amount of the first digital asset from a reserve public address on the first blockchain to a second designated public address on the first blockchain; and (ii) transfer a fourth amount of the first digital asset from the reserve public address to an exchange public address associated with the administrator, wherein the administrator computer system digitally signs the third transaction request with a third private key associated with the administrator; and (6) publishing, by the administrator computer system to the first blockchain, the third transaction request; and (e) confirming, by the administrator computer system based on reference to the first blockchain, that the third transaction request was executed by performing the steps of: (1) monitoring the second designated public address on the first blockchain; and (2) determining the third amount of the first digital asset was received at the second designated public address; and (3) updating, by the administrator computer system, the first electronic ledger to account for the third transaction request.

In embodiments, the second blockchain is the Ethereum network.

In embodiments, the first blockchain is the Bitcoin network.

In embodiments, the first blockchain is the Bitcoin Cash network.

In embodiments, the first blockchain is the Stellar network.

In embodiments, the first blockchain is the Filecoin network.

In embodiments, the first blockchain is the Litecoin network.

In embodiments, the first blockchain is the Tezos network.

In embodiments, the first blockchain is the Zcash network.

In embodiments, the first blockchain is the Neo network.

In embodiments, the first blockchain is the Ether Classic network.

In embodiments, the second blockchain is the Neo network.

In embodiments, the second blockchain is the Ether Classic network.

In embodiments, the digital signature is first transaction request include a digital signature generated using at least two private keys associated with the administrator.

In embodiments, the first transaction information comprises information sufficient to indicate a plurality of transactions, including, for each respective transaction: i. respective transaction identification information including a respective transaction identifier associated with the respective transfer of a respective amount of the first digital asset to a respective designated public address; ii. a first respective public address; and iii. a second respective public address.

In embodiments, the first transaction request includes a first plurality of instructions, each associated with generating a respective designated public address associated with depositing the first digital asset, wherein the second transaction request includes a second plurality of instructions, each associated with transferring a respective reserve amount of the first digital asset to the reserve public address and a respective fee amount of the first digital asset to the first exchange public address, and wherein the third transaction request includes a third plurality of instructions, each associated with transferring a respective amount of the second digital asset to a respective digital address on the second blockchain.

In embodiments, the first transaction request is digitally signed with at least two private keys associated with the administrator.

In embodiments, the second transaction request is digitally signed with at least two private keys associated with the administrator.

In embodiments, the third transaction request is digitally signed with at least two private keys associated with the administrator.

In embodiments, the first transaction request is published via a secure channel.

In embodiments, the second transaction request is published via a secure channel.

In embodiments, the third transaction request is published via a secure channel.

In embodiments, the first designated public address is unique to the first user.

In embodiments, the second designated public address is unique to the first user.

In embodiments, conditions under which transaction requests published on the second blockchain are verified in accordance with the verification instructions includes verifying a digital signature associated with published transaction requests such that the verified digital signature is associated with the administrator.

In embodiments, the first transaction information associated with the second transaction request includes an identifier unique to the second transaction request.

In embodiments, the method may further comprise: (m) prior to determining the first amount of the first digital asset was received at the first designated public address, generating third-party monitoring information including the first designated public address; (n) sending, by the administrator computer system to a third-party computer system associated with a third-party, the third-party monitoring information, wherein the third-party computer system monitors the first blockchain for one or more transactions associated with the first designated public address, wherein the third-party computer system determines the first amount of the first digital asset was received at the first designated public address, wherein the third-party computer system obtains the first transaction information, wherein the third-party computer system generates a notification indicating the obtained fist transaction information, and wherein the third-party computer system sends, to the administrator computer system, the generated notification.

In embodiments, the notification is encrypted and sent via a secure channel.

In embodiments, the notification is encrypted by the third-party computer system.

In embodiments, the notification is encrypted communication.

In embodiments, the notification is encrypted using an asymmetric key.

In embodiments, the asymmetric key is a PKI key.

In embodiments, the notification is encrypted using a symmetric key.

In embodiments, the notification is encrypted in accordance with Transport Layer Security protocol.

In embodiments, the notification is encrypted by the administrator computer system.

In embodiments, the authentication request is made by the first user device via a secure channel.

In embodiments, the authentication request is encrypted communication.

In embodiments, the authentication request is encrypted using an asymmetric key.

In embodiments, the asymmetric key is a PKI key.

In embodiments, the authentication request is encrypted using a symmetric key.

In embodiments, the authentication request is encrypted in accordance with Transport Layer Security protocol.

In embodiments, the authentication request is encrypted by the first user device.

In embodiments, the authentication request is encrypted by the administrator computer system.

In embodiments, the first machine-executable instructions are transmitted by the administrator computer system via a secure channel.

In embodiments, the first machine-executable instructions are encrypted communication.

In embodiments, the first machine-executable instructions are encrypted using an asymmetric key.

In embodiments, the asymmetric key is a PKI key.

In embodiments, the first machine-executable instructions are encrypted using a symmetric key.

In embodiments, the first machine-executable instructions are encrypted in accordance with Transport Layer Security protocol.

In embodiments, the first machine-executable instructions are encrypted by the first user device.

In embodiments, the first machine-executable instructions are encrypted by the administrator computer system.

In embodiments, the first request is made by the first user device via a secure channel.

In embodiments, the first request is encrypted communication.

In embodiments, the first request is encrypted using an asymmetric key.

In embodiments, the asymmetric key is a PKI key.

In embodiments, the first request is encrypted using a symmetric key.

In embodiments, the first request is encrypted in accordance with Transport Layer Security protocol.

In embodiments, the first request is encrypted by the first user device.

In embodiments, the first request is encrypted by the administrator computer system.

In embodiments, the first message is sent by the administrator computer system via a secure channel.

In embodiments, the first message is encrypted communication.

In embodiments, the first message is encrypted using an asymmetric key.

In embodiments, the asymmetric key is a PKI key.

In embodiments, the first message is encrypted using a symmetric key.

In embodiments, the first message is encrypted in accordance with Transport Layer Security protocol.

In embodiments, the first message is encrypted by the first user device.

In embodiments, the first message is encrypted by the administrator computer system.

In embodiments, the first transaction request is published via a secure channel.

In embodiments, the second transaction request is published via a secure channel.

In embodiments, the third transaction request is published via a secure channel.

In embodiments, the second blockchain is based on a mathematical protocol for proof of work.

In embodiments, the second blockchain is based on a mathematical protocol for proof of stake.

In embodiments, the second blockchain is based on a cryptographic mathematical protocol.

In embodiments, the method may further comprise a step of publishing, by the administrator computer system to a side ledger, transaction instructions associated with crediting the second amount of the second digital asset and the publishing step (d)(2) includes publishing the transaction instruction from the side ledger to the second distributed public asset ledger periodically or aperiodically.

In embodiments, the first electronic ledger is maintained and stored on the first plurality of geographically distributed computer systems in the first peer-to-peer network in the form of the first blockchain.

In embodiments, the first electronic ledger is maintained on a sidechain, separate from the first blockchain, wherein information on the sidechain is published and stored on the first blockchain periodically or aperiodically.

In embodiments, the second electronic ledger is maintained and stored on the second plurality of geographically distributed computer systems in the second peer-to-peer network in the form of the second blockchain.

In embodiments, the second electronic ledger is maintained on a sidechain, separate from the second blockchain, wherein information on the sidechain is published and stored on the second blockchain periodically or aperiodically.

In embodiments, the first electronic ledger and the second electronic ledger are maintained in separate databases.

In embodiments, the predetermined fixed ratio is one first digital asset for one second digital asset.

In embodiments, the predetermined fixed ratio is 100 first digital asset for one second digital asset.

In embodiments, a method may comprise the steps of: (a) authenticating, by a digital asset exchange computer system associated with a digital asset exchange, an access request by a first user device associated with a first user, to the digital asset exchange computer system, wherein the digital asset exchange computer system is operatively connected to one or more databases which include: i. a first electronic ledger associated with a first digital asset maintained on a first distributed public transaction ledger in the form of a first blockchain that is maintained by a first blockchain network including a first plurality of geographically distributed computer systems in a first peer-to-peer network; ii. a second electronic ledger associated with a second digital asset maintained on a second distributed public transaction ledger in the form of a second blockchain that is maintained by a second blockchain network including a second plurality of geographically distributed computer systems in a second peer-to-peer network, wherein a ratio of second digital asset to first digital asset is a predetermined fixed ratio, and wherein authenticating the access request received from the first user device comprises the steps of: (1) receiving, by the digital asset exchange computer system from the first user device, an authentication request including first user credential information associated with the first user; (2) determining, by the digital asset exchange computer system, that the first user device is authorized to access the digital asset exchange computer system based at least in part on the first user credential information; (3) generating, by the digital asset exchange computer system, first machine-executable instructions including first graphical user interface information associated with a first graphical user interface; (4) transmitting, from the digital asset exchange computer system to the first user device, the first machine-executable instructions, wherein, upon execution of the first machine-executable instructions, the first user device displays the first graphical user interface; (b) receiving, by the digital asset computer system from the first user device, a first request to obtain a first amount of the first digital asset in exchange for a second amount of the second digital asset, comprising the steps of: (1) receiving, by the digital asset exchange computer system from the first user device, the first request; (2) verifying, by the digital asset exchange computer system, the first request by determining the first user has at least the second amount of the second digital asset based on reference to the second electronic ledger, (3) generating, by the digital asset exchange computer system, a first transaction request including first instructions to generate a first designated public address on the second blockchain, wherein the digital asset exchange computer system digitally signs the first transaction request with a first private key associated with the digital asset exchange; (4) publishing, by the digital asset exchange computer system, the first transaction request such that the second plurality of geographically distributed computer systems in the second peer-to-peer network verify the first transaction request and execute the first instructions by generating first designated address information including a first designated key pair associated with a first designated public address on the second blockchain; (5) obtaining, by the digital asset exchange computer system based on reference to the second blockchain, first designated address information; (6) generating, by the digital asset exchange computer system, a first message including instructions for the first user to transfer the second amount of the second digital asset to the first designated public address on the second blockchain; and (7) sending, by the digital asset exchange computer system to the first user device, the first message; (c) confirming, by the digital asset exchange computer system based on reference to the second blockchain, a first deposit of the second amount of the second digital asset by performing the steps of: (1) monitoring the first designated public address on the second blockchain; and (2) determining the second amount of the second digital asset was received at the first designated public address; (d) issuing, by the digital asset exchange computer system, the first amount of the first digital asset by performing the steps of: (1) generating, by the digital asset exchange computer system, a second transaction request including a second message comprising second instructions to: (i) transfer the second amount of the second digital asset from the first designated public address to a first smart contract address on the second blockchain; and (ii) burn the second amount of the second digital asset; wherein the first smart contract address is associated with first smart contract instructions saved as part of the second blockchain and including: (i) verification instructions indicating conditions under which transaction requests published on the second blockchain and addressed to the first smart contract address are verified; and (ii) burn instructions indicating conditions under which the second digital asset is burned, and wherein the digital asset exchange computer system digitally signs the second transaction request with a second private key associated with the digital asset exchange; (2) publishing, by the digital asset exchange computer system to the first smart contract address on the second blockchain, the second transaction; (3) confirming, by the digital asset exchange computer system, the second transaction request was executed based on reference to the second blockchain; (4) updating, by the digital asset exchange computer system, the second electronic ledger to account for the second transaction request; (5) generating, by the digital asset exchange computer system, a third transaction request including third instructions to: (i) transfer a third amount of the first digital asset from a reserve public address on the first blockchain to a second designated public address on the first blockchain; and (ii) transfer a fourth amount of the first digital asset from the reserve public address to an exchange public address associated with the digital asset exchange, wherein the digital asset exchange computer system digitally signs the third transaction request with a third private key associated with the digital asset exchange; and (6) publishing, by the digital asset exchange computer system to the first blockchain, the third transaction request; and (e) confirming, by the digital asset exchange computer system based on reference to the first blockchain, that the third transaction request was executed by performing the steps of: (1) monitoring the second designated public address on the first blockchain; and (2) determining the third amount of the first digital asset was received at the second designated public address; and (3) updating, by the digital asset exchange computer system, the first electronic ledger to account for the third transaction request.

In embodiments, the second blockchain is the Ethereum network.

In embodiments, the first blockchain is the Bitcoin network.

In embodiments, the first blockchain is the Bitcoin Cash network.

In embodiments, the first blockchain is the Stellar network.

In embodiments, the first blockchain is the Filecoin network.

In embodiments, the first blockchain is the Litecoin network.

In embodiments, the first blockchain is the Tezos network.

In embodiments, the first blockchain is the Zcash network.

In embodiments, the first blockchain is the Neo network.

In embodiments, the first blockchain is the Ether Classic network.

In embodiments, the second blockchain is the Neo network.

In embodiments, the second blockchain is the Ether Classic network.

In embodiments, the digital signature is first transaction request include a digital signature generated using at least two private keys associated with the digital asset exchange.

In embodiments, the first transaction information comprises information sufficient to indicate a plurality of transactions, including, for each respective transaction: i. respective transaction identification information including a respective transaction identifier associated with the respective transfer of a respective amount of the first digital asset to a respective designated public address; ii. a first respective public address; and iii. a second respective public address.

In embodiments, the first transaction request includes a first plurality of instructions, each associated with generating a respective designated public address associated with depositing the first digital asset, wherein the second transaction request includes a second plurality of instructions, each associated with transferring a respective reserve amount of the first digital asset to the reserve public address and a respective fee amount of the first digital asset to the first exchange public address, and wherein the third transaction request includes a third plurality of instructions, each associated with transferring a respective amount of the second digital asset to a respective digital address on the second blockchain.

In embodiments, the first transaction request is digitally signed with at least two private keys associated with the digital asset exchange.

In embodiments, the second transaction request is digitally signed with at least two private keys associated with the digital asset exchange.

In embodiments, the third transaction request is digitally signed with at least two private keys associated with the digital asset exchange.

In embodiments, the first transaction request is published via a secure channel.

In embodiments, the second transaction request is published via a secure channel.

In embodiments, the third transaction request is published via a secure channel.

In embodiments, the first designated public address is unique to the first user.

In embodiments, the second designated public address is unique to the first user.

In embodiments, conditions under which transaction requests published on the second blockchain are verified in accordance with the verification instructions includes verifying a digital signature associated with published transaction requests such that the verified digital signature is associated with the digital asset exchange.

In embodiments, the first transaction information associated with the second transaction request includes an identifier unique to the second transaction request.

In embodiments, the method may further comprise: (m) prior to determining the first amount of the first digital asset was received at the first designated public address, generating third-party monitoring information including the first designated public address; (n) sending, by the digital asset exchange computer system to a third-party computer system associated with a third-party, the third-party monitoring information, wherein the third-party computer system monitors the first blockchain for one or more transactions associated with the first designated public address, wherein the third-party computer system determines the first amount of the first digital asset was received at the first designated public address, wherein the third-party computer system obtains the first transaction information, wherein the third-party computer system generates a notification indicating the obtained fist transaction information, and wherein the third-party computer system sends, to the digital asset exchange computer system, the generated notification.

In embodiments, the notification is encrypted and sent via a secure channel.

In embodiments, the notification is encrypted by the third-party computer system.

In embodiments, the notification is encrypted communication.

In embodiments, the notification is encrypted using an asymmetric key.

In embodiments, the asymmetric key is a PKI key.

In embodiments, the notification is encrypted using a symmetric key.

In embodiments, the notification is encrypted in accordance with Transport Layer Security protocol.

In embodiments, the notification is encrypted by the digital asset exchange computer system.

In embodiments, the authentication request is made by the first user device via a secure channel.

In embodiments, the authentication request is encrypted communication.

In embodiments, the authentication request is encrypted using an asymmetric key.

In embodiments, the asymmetric key is a PKI key.

In embodiments, the authentication request is encrypted using a symmetric key.

In embodiments, the authentication request is encrypted in accordance with Transport Layer Security protocol.

In embodiments, the authentication request is encrypted by the first user device.

In embodiments, the authentication request is encrypted by the digital asset exchange computer system.

In embodiments, the first machine-executable instructions are encrypted communication.

In embodiments, the first machine-executable instructions are encrypted using an asymmetric key.

In embodiments, the asymmetric key is a PKI key.

In embodiments, the first machine-executable instructions are encrypted using a symmetric key.

In embodiments, the first machine-executable instructions are encrypted in accordance with Transport Layer Security protocol.

In embodiments, the first machine-executable instructions are encrypted by the first user device.

In embodiments, the first machine-executable instructions are encrypted by the digital asset exchange computer system.

In embodiments, the first request is made by the first user device via a secure channel.

In embodiments, the first request is encrypted communication.

In embodiments, the first request is encrypted using an asymmetric key.

In embodiments, the asymmetric key is a PKI key.

In embodiments, the first request is encrypted using a symmetric key.

In embodiments, the first request is encrypted in accordance with Transport Layer Security protocol.

In embodiments, the first request is encrypted by the first user device.

In embodiments, the first request is encrypted by the digital asset exchange computer system.

In embodiments, the first message is sent by the digital asset exchange computer system via a secure channel.

In embodiments, the first message is encrypted communication.

In embodiments, the first message is encrypted using an asymmetric key.

In embodiments, the asymmetric key is a PKI key.

In embodiments, the first message is encrypted using a symmetric key.

In embodiments, the first message is encrypted in accordance with Transport Layer Security protocol.

In embodiments, the first message is encrypted by the first user device.

In embodiments, the first message is encrypted by the digital asset exchange computer system.

In embodiments, the first transaction request is published via a secure channel.

In embodiments, the second transaction request is published via a secure channel.

In embodiments, the third transaction request is published via a secure channel.

In embodiments, the second blockchain is based on a mathematical protocol for proof of work.

In embodiments, the second blockchain is based on a mathematical protocol for proof of stake.

In embodiments, the second blockchain is based on a cryptographic mathematical protocol.

In embodiments, the method further comprises a step of publishing, by the digital asset exchange computer system to a side ledger, transaction instructions associated with crediting the second amount of the second digital asset and the publishing step (d)(2) includes publishing the transaction instruction from the side ledger to the second distributed public asset ledger periodically or aperiodically.

In embodiments, the first electronic ledger is maintained and stored on the first plurality of geographically distributed computer systems in the first peer-to-peer network in the form of the first blockchain.

In embodiments, the first electronic ledger is maintained on a sidechain, separate from the first blockchain, wherein information on the sidechain is published and stored on the first blockchain periodically or aperiodically.

In embodiments, the second electronic ledger is maintained and stored on the second plurality of geographically distributed computer systems in the second peer-to-peer network in the form of the second blockchain.

In embodiments, the second electronic ledger is maintained on a sidechain, separate from the second blockchain, wherein information on the sidechain is published and stored on the second blockchain periodically or aperiodically.

In embodiments, the first electronic ledger and the second electronic ledger are maintained in separate databases.

In embodiments, the predetermined fixed ratio is one first digital asset for one second digital asset.

In embodiments, the predetermined fixed ratio is 100 first digital asset for one second digital asset.

In embodiments, a method may comprise the steps of: (a) authenticating, by a digital asset token issuer computer system associated with a digital asset token issuer, an access request by a first user device associated with a first user, to the digital asset token issuer computer system, wherein the digital asset token issuer computer system is operatively connected to one or more databases which include: i. a first electronic ledger associated with a first digital asset maintained on a first distributed public transaction ledger in the form of a first blockchain that is maintained by a first blockchain network including a first plurality of geographically distributed computer systems in a first peer-to-peer network; ii. a second electronic ledger associated with a second digital asset maintained on a second distributed public transaction ledger in the form of a second blockchain that is maintained by a second blockchain network including a second plurality of geographically distributed computer systems in a second peer-to-peer network, wherein a ratio of second digital asset to first digital asset is a predetermined fixed ratio, and wherein authenticating the access request received from the first user device comprises the steps of: (1) receiving, by the digital asset token issuer computer system from the first user device, an authentication request including first user credential information associated with the first user; (2) determining, by the digital asset token issuer computer system, that the first user device is authorized to access the digital asset token issuer computer system based at least in part on the first user credential information; (3) generating, by the digital asset token issuer computer system, first machine-executable instructions including first graphical user interface information associated with a first graphical user interface; (4) transmitting, from the digital asset token issuer computer system to the first user device, the first machine-executable instructions, wherein, upon execution of the first machine-executable instructions, the first user device displays the first graphical user interface; (b) receiving, by the digital asset computer system from the first user device, a first request to obtain a first amount of the first digital asset in exchange for a second amount of the second digital asset, comprising the steps of: (1) receiving, by the digital asset token issuer computer system from the first user device, the first request; (2) verifying, by the digital asset token issuer computer system, the first request by determining the first user has at least the second amount of the second digital asset based on reference to the second electronic ledger; (3) generating, by the digital asset token issuer computer system, a first transaction request including first instructions to generate a first designated public address on the second blockchain, wherein the digital asset token issuer computer system digitally signs the first transaction request with a first private key associated with the digital asset token issuer; (4) publishing, by the digital asset token issuer computer system, the first transaction request such that the second plurality of geographically distributed computer systems in the second peer-to-peer network verify the first transaction request and execute the first instructions by generating first designated address information including a first designated key pair associated with a first designated public address on the second blockchain; (5) obtaining, by the digital asset token issuer computer system based on reference to the second blockchain, first designated address information; (6) generating, by the digital asset token issuer computer system, a first message including instructions for the first user to transfer the second amount of the second digital asset to the first designated public address on the second blockchain; and (7) sending, by the digital asset token issuer computer system to the first user device, the first message; (c) confirming, by the digital asset token issuer computer system based on reference to the second blockchain, a first deposit of the second amount of the second digital asset by performing the steps of: (1) monitoring the first designated public address on the second blockchain; and (2) determining the second amount of the second digital asset was received at the first designated public address; (d) issuing, by the digital asset token issuer computer system, the first amount of the first digital asset by performing the steps of: (1) generating, by the digital asset token issuer computer system, a second transaction request including a second message comprising second instructions to: (i) transfer the second amount of the second digital asset from the first designated public address to a first smart contract address on the second blockchain; and (ii) burn the second amount of the second digital asset; wherein the first smart contract address is associated with first smart contract instructions saved as part of the second blockchain and including: (i) verification instructions indicating conditions under which transaction requests published on the second blockchain and addressed to the first smart contract address are verified; and (ii) burn instructions indicating conditions under which the second digital asset is burned, and wherein the digital asset token issuer computer system digitally signs the second transaction request with a second private key associated with the digital asset token issuer; (2) publishing, by the digital asset token issuer computer system to the first smart contract address on the second blockchain, the second transaction; (3) confirming, by the digital asset token issuer computer system, the second transaction request was executed based on reference to the second blockchain; (4) updating, by the digital asset token issuer computer system, the second electronic ledger to account for the second transaction request; (5) generating, by the digital asset token issuer computer system, a third transaction request including third instructions to: (i) transfer a third amount of the first digital asset from a reserve public address [RESERVE] on the first blockchain to a second designated public address on the first blockchain; and (ii) transfer a fourth amount [FEE] of the first digital asset from the reserve public address to an exchange public address associated with the digital asset token issuer, wherein the digital asset token issuer computer system digitally signs the third transaction request with a third private key associated with the digital asset token issuer; and (6) publishing, by the digital asset token issuer computer system to the first blockchain, the third transaction request; and (e) confirming, by the digital asset token issuer computer system based on reference to the first blockchain, that the third transaction request was executed by performing the steps of: (1) monitoring the second designated public address on the first blockchain; and (2) determining the third amount of the first digital asset was received at the second designated public address; and (3) updating, by the digital asset token issuer computer system, the first electronic ledger to account for the third transaction request.

In embodiments, the second blockchain is the Ethereum network.

In embodiments, the first blockchain is the Bitcoin network.

In embodiments, the first blockchain is the Bitcoin Cash network.

In embodiments, the first blockchain is the Stellar network.

In embodiments, the first blockchain is the Filecoin network.

In embodiments, the first blockchain is the Litecoin network.

In embodiments, the first blockchain is the Tezos network.

In embodiments, the first blockchain is the Zcash network.

In embodiments, the first blockchain is the Neo network.

In embodiments, the first blockchain is the Ether Classic network.

In embodiments, the second blockchain is the Neo network.

In embodiments, the second blockchain is the Ether Classic network.

In embodiments, the digital signature is first transaction request include a digital signature generated using at least two private keys associated with the digital asset token issuer.

In embodiments, the first transaction information comprises information sufficient to indicate a plurality of transactions, including, for each respective transaction: i. respective transaction identification information including a respective transaction identifier associated with the respective transfer of a respective amount of the first digital asset to a respective designated public address; ii. a first respective public address; and iii. a second respective public address.

In embodiments, the first transaction request includes a first plurality of instructions, each associated with generating a respective designated public address associated with depositing the first digital asset, wherein the second transaction request includes a second plurality of instructions, each associated with transferring a respective reserve amount of the first digital asset to the reserve public address and a respective fee amount of the first digital asset to the first exchange public address, and wherein the third transaction request includes a third plurality of instructions, each associated with transferring a respective amount of the second digital asset to a respective digital address on the second blockchain.

In embodiments, the first transaction request is digitally signed with at least two private keys associated with the digital asset token issuer.

In embodiments, the second transaction request is digitally signed with at least two private keys associated with the digital asset token issuer.

In embodiments, the third transaction request is digitally signed with at least two private keys associated with the digital asset token issuer.

In embodiments, the first transaction request is published via a secure channel.

In embodiments, the second transaction request is published via a secure channel.

In embodiments, the third transaction request is published via a secure channel.

In embodiments, the second designated public address is unique to the first user.

In embodiments, conditions under which transaction requests published on the second blockchain are verified in accordance with the verification instructions includes verifying a digital signature associated with published transaction requests such that the verified digital signature is associated with the digital asset token issuer.

In embodiments, the first transaction information associated with the second transaction request includes an identifier unique to the second transaction request.

In embodiments, the method may further comprise: (m) prior to determining the first amount of the first digital asset was received at the first designated public address, generating third-party monitoring information including the first designated public address; (n) sending, by the digital asset token issuer computer system to a third-party computer system associated with a third-party, the third-party monitoring information, wherein the third-party computer system monitors the first blockchain for one or more transactions associated with the first designated public address, wherein the third-party computer system determines the first amount of the first digital asset was received at the first designated public address, wherein the third-party computer system obtains the first transaction information, wherein the third-party computer system generates a notification indicating the obtained fist transaction information, and wherein the third-party computer system sends, to the digital asset token issuer computer system, the generated notification.

In embodiments, the notification is encrypted and sent via a secure channel.

In embodiments, the notification is encrypted by the third-party computer system.

In embodiments, the notification is encrypted communication.

In embodiments, the notification is encrypted using an asymmetric key.

In embodiments, the asymmetric key is a PKI key.

In embodiments, the notification is encrypted using a symmetric key.

In embodiments, the notification is encrypted in accordance with Transport Layer Security protocol.

In embodiments, the notification is encrypted by the digital asset token issuer computer system.

In embodiments, the authentication request is made by the first user device via a secure channel.

In embodiments, the authentication request is encrypted communication.

In embodiments, the authentication request is encrypted using an asymmetric key.

In embodiments, the asymmetric key is a PKI key.

In embodiments, the authentication request is encrypted using a symmetric key.

In embodiments, the authentication request is encrypted in accordance with Transport Layer Security protocol.

In embodiments, the authentication request is encrypted by the first user device.

In embodiments, the authentication request is encrypted by the digital asset token issuer computer system.

In embodiments, the first machine-executable instructions are transmitted by the digital asset token issuer computer system via a secure channel.

In embodiments, the first machine-executable instructions are encrypted communication.

In embodiments, the first machine-executable instructions are encrypted using an asymmetric key.

In embodiments, the asymmetric key is a PKI key.

In embodiments, the first machine-executable instructions are encrypted using a symmetric key.

In embodiments, the first machine-executable instructions are encrypted in accordance with Transport Layer Security protocol.

In embodiments, the first machine-executable instructions are encrypted by the first user device.

In embodiments, the first machine-executable instructions are encrypted by the digital asset token issuer computer system.

In embodiments, the first request is made by the first user device via a secure channel.

In embodiments, the first request is encrypted communication.

In embodiments, the first request is encrypted using an asymmetric key.

In embodiments, the asymmetric key is a PKI key.

In embodiments, the first request is encrypted using a symmetric key.

In embodiments, the first request is encrypted in accordance with Transport Layer Security protocol.

In embodiments, the first request is encrypted by the first user device.

In embodiments, the first request is encrypted by the digital asset token issuer computer system.

In embodiments, the first message is sent by the digital asset token issuer computer system via a secure channel.

In embodiments, the first message is encrypted communication.

In embodiments, the first message is encrypted using an asymmetric key.

In embodiments, the asymmetric key is a PKI key.

In embodiments, the first message is encrypted using a symmetric key.

In embodiments, the first message is encrypted in accordance with Transport Layer Security protocol.

In embodiments, the first message is encrypted by the first user device.

In embodiments, the first message is encrypted by the digital asset token issuer computer system.

In embodiments, the first transaction request is published via a secure channel.

In embodiments, the second transaction request is published via a secure channel.

In embodiments, the third transaction request is published via a secure channel.

In embodiments, the second blockchain is based on a mathematical protocol for proof of work.

In embodiments, the second blockchain is based on a mathematical protocol for proof of stake.

In embodiments, the second blockchain is based on a cryptographic mathematical protocol.

In embodiments, the method may further comprise a step of publishing, by the digital asset token issuer computer system to a side ledger, transaction instructions associated with crediting the second amount of the second digital asset and the publishing step (d)(2) includes publishing the transaction instruction from the side ledger to the second distributed public asset ledger periodically or aperiodically.

In embodiments, the first electronic ledger is maintained and stored on the first plurality of geographically distributed computer systems in the first peer-to-peer network in the form of the first blockchain.

In embodiments, the first electronic ledger is maintained on a sidechain, separate from the first blockchain, wherein information on the sidechain is published and stored on the first blockchain periodically or aperiodically.

In embodiments, the second electronic ledger is maintained and stored on the second plurality of geographically distributed computer systems in the second peer-to-peer network in the form of the second blockchain.

In embodiments, the second electronic ledger is maintained on a sidechain, separate from the second blockchain, wherein information on the sidechain is published and stored on the second blockchain periodically or aperiodically.

In embodiments, the first electronic ledger and the second electronic ledger are maintained in separate databases.

In embodiments, the predetermined fixed ratio is one first digital asset for one second digital asset.

In embodiments, the predetermined fixed ratio is 100 first digital asset for one second digital asset.

In embodiments, a method of issuing electronic payments using a stable value digital asset token on a digital asset security token may comprise the steps of: (a) providing a digital asset security token database stored on a first set of one or more computer readable media associated with a digital asset security token issuer system associated with a digital asset security token issuer, wherein the digital asset security token database comprises a log of digital asset security tokens including: (i) a first set of digital asset addresses including a respective digital asset address for each respective digital asset security token holder; and (ii) a respective digital asset security token amount associated with each respective digital asset address, wherein each respective digital asset address of the first set of digital asset addresses is tied to a first distributed public transaction ledger maintained by a first plurality of geographically distributed computer systems in a first peer-to-peer network in the form of a first blockchain; (b) providing a stable value digital asset token database stored on the first distributed public transaction ledger maintained by the first plurality of geographically distributed computer systems in the first peer-to-peer network in the form of the first blockchain, wherein the stable value digital asset token database comprises a log of stable value digital asset tokens including: (i) a second set of digital asset addresses including a second respective digital asset address for each respective stable value digital asset token holder; (ii) a respective stable value digital asset token amount for each respective stable value digital asset token holder, wherein the stable value digital asset tokens are issued by a stable value Administrator using an Administrator computer system associated with a Administrator; (c) receiving, by the Administrator computer system, a first request from the digital asset security token issuer system to purchase a first sum of stable value digital asset tokens in exchange for a second sum of a second digital asset, wherein the first sum corresponds to the second sum based on a fixed notional amount, wherein the second digital asset is maintained on a second distributed public transaction ledger maintained by a second plurality of geographically distributed computer systems in a second peer-to-peer network in the form of a second blockchain; (d) verifying, by the Administrator computer system, the first request, including: (i) verifying, by the Administrator computer system, that the digital asset security token issuer is a registered user of the Administrator; and (ii) verifying, by the Administrator computer system, that the digital asset security token issuer has at least the second sum of the second digital asset available for transaction with the Administrator as reflected in a second digital asset electronic ledger of the Administrator computer system; (e) accessing, by the Administrator computer system, the digital asset security token database to determine: (i) each respective digital asset address of the first set of digital asset addresses on the first blockchain for each respective digital asset security token holder; and (ii) the respective digital asset security token amount associated with each respective digital asset address; (f) determining a respective payment amount in stable value digital asset tokens to be made to each respective digital asset address of the first set of digital asset addresses based at least in part on the fixed notional amount, the first sum of stable value digital asset tokens, and the respective digital asset security token amount associated with each respective digital asset address of the first set of digital asset addresses; (g) generating, by the Administrator computer system, transaction instructions for the first sum of stable value digital asset tokens by updating the stable value digital asset token database to reflect the addition of new stable value digital asset tokens in the amount of the first sum and the corresponding digital asset addresses associated with each new stable value digital asset token and a digital signature based on a private key associated with the Administrator; (h) transferring, by the Administrator computer system, the first sum of the stable value digital asset on a stable value digital asset electronic ledger from the user account of the digital asset security token issuer, to a custodial account of the Administrator associated with stable value digital asset tokens; (i) generating, by the Administrator computer system to the first blockchain, transaction instructions associated with crediting the respective payment amount of stable value digital asset tokens to each respective digital asset address of the first set of digital asset addresses; (j) publishing, by the Administrator computer system to the first blockchain, the transaction instructions associated with crediting the respective payment amount of stable value digital asset tokens to each respective digital asset address of the first set of digital asset addresses, where ownership of each digital asset security token associated with each respective digital asset security token amount remains the same; and (k) notifying, by the Administrator computer system, each digital asset address of the first set of the digital asset addresses of each respective transfer of stable value digital asset tokens to each respective digital asset address of the first set of digital asset addresses.

In embodiments, verifying the first request further includes: (iii) verifying, by the Administrator computer system, the second sum of the second digital asset is associated with a public address on the second blockchain associated with the digital asset security token issuer.

In embodiments, the first blockchain is an Ethereum network.

In embodiments, the second blockchain is a Bitcoin network.

In embodiments, the second blockchain is a Bitcoin Cash network.

In embodiments, the second blockchain is a Stellar network.

In embodiments, the second blockchain is a Filecoin network.

In embodiments, the second blockchain is a Litecoin network.

In embodiments, the second blockchain is a Tezos network.

In embodiments, the second blockchain is a Zcash network.

In embodiments, the first blockchain is a Neo Network.

In embodiments, the first blockchain is an Ether Classic network.

In embodiments, the Administrator is a regulated digital asset exchange.

In embodiments, the digital asset security token is a security registered with a government authority.

In embodiments, the digital asset security token is a debt security and the electronic payments are interest.

In embodiments, the digital asset security token is an equity security and the electronic payments are dividends.

In embodiments, the digital asset security token is secured by intellectual property rights and the electronic payments are royalties.

In embodiments, the second blockchain is based on a mathematical protocol for proof of work.

In embodiments, the second blockchain is based on a mathematical protocol for proof of stake.

In embodiments, the second blockchain is based on a cryptographic mathematical protocol.

In embodiments, the method may further comprise a step of publishing, by the Administrator computer system to a side ledger, the transaction instructions associated with crediting the respective payment amount of stable value digital asset tokens to each respective digital asset address of the first set of digital asset addresses and the publishing step (j) includes publishing the transaction instructions from the side ledger to the first distributed public asset ledger periodically or aperiodically.

In embodiments, the method may further comprise steps of: (1) receiving, at the digital asset security token issuer system, from at least one digital asset security token holder, a payment request prior to the receiving step (c), the payment request including: (i) a digital asset address of the at least one digital asset security token holder; and (ii) a request to transfer a payment amount of stable value digital asset tokens to the digital asset address of the at least one digital asset security token holder; (m) confirming, by the digital asset security token issuer system, that: (A) the digital asset address of the at least one digital asset security token holder is valid; (B) the digital asset security token amount of digital asset security tokens associated with the digital asset address of the at least one digital asset security token holder is more than zero; and (C) the at least one digital asset security token holder is entitled to payment; and (n) generating, at the digital asset security token issuer system, the first request based at least in part on the payment request when the digital asset address of the at least one digital asset security token holder is valid, the digital asset security token amount of digital asset security tokens associated with the digital asset address of the at least one digital asset security token holder is more than zero and the at least one digital asset security token holder is entitled to payment.

In embodiments, the first set of one or more computer readable media associated with the digital asset security token issuer system is operably connected to a node of the first plurality of geographically distributed computer systems in the first peer-to-peer network in the form of the first blockchain, wherein the node is maintained by the first digital asset security token issuer.

In embodiments, the digital asset security token database is maintained and stored on the first plurality of geographically distributed computer systems in the first peer-to-peer network in the form of the first blockchain.

In embodiments, the digital asset security token database is maintained on a sidechain, separate from the first blockchain, wherein information on the sidechain is published and stored on the first blockchain periodically or aperiodically.

In embodiments, the generating step (i) includes generating, by the Administrator computer system, transaction instructions for the first sum of stable value digital asset tokens to update the stable value digital asset token database to reserve stable value digital asset tokens in the amount of the first sum.

In embodiments, the payment amount relates to a dividend to be paid based on ownership of each digital asset security token.

In embodiments, the payment amount relates to a royalty to be paid based on ownership of each digital asset security token.

In embodiments, the payment amount relates to interest to be paid based on ownership of each digital asset security token.

In embodiments, the digital signature is based on at least two private keys associated with the Administrator.

In embodiments, the first request includes a first plurality of requests associated with a plurality of users, wherein each respective purchase request of the first plurality of purchase requests includes a respective request to purchase a respective sum stable value digital asset tokens.

In embodiments, the transaction instructions include a plurality of transaction instructions, each instruction being associated with a corresponding message including the digital signature based on the Administrator private key.

In embodiments, the digital signature is based on at least two private keys associated with the Administrator.

In embodiments, the first request is made by the first user device via a secure channel.

In embodiments, the first request is encrypted communication.

In embodiments, the first request is encrypted using an asymmetric key.

In embodiments, the asymmetric key is a PKI key.

In embodiments, the first request is encrypted using a symmetric key.

In embodiments, the first request is encrypted in accordance with Transport Layer Security protocol.

In embodiments, the first request is encrypted by the first user device.

In embodiments, the first request is encrypted by the Administrator computer system.

In embodiments, each notification is encrypted.

In embodiments, each notification is encrypted using an asymmetric key.

In embodiments, the asymmetric key is a PKI key.

In embodiments, each notification is encrypted using a symmetric key.

In embodiments, each notification is encrypted in accordance with Transport Layer Security protocol.

In embodiments, each notification is encrypted by the first user device.

In embodiments, each notification is encrypted by the Administrator computer system.

In embodiments, the stable value digital asset electronic ledger and the second digital asset electronic digital asset ledger are maintained by the Administrator computer system.

In embodiments, the stable value digital asset electronic ledger and the second digital asset electronic digital asset ledger are maintained in a single database.

In embodiments, the stable value digital asset electronic ledger and the second digital asset electronic digital asset ledger are maintained in separate databases.

In embodiments, the transaction instructions include a digital signature based on a private key associated with the Administrator computer system.

In embodiments, a method of issuing electronic payments using a stable value digital asset token on a digital asset security token may comprise the steps of: (a) providing a digital asset security token database stored on a first set of one or more computer readable media associated with a digital asset security token issuer system associated with a digital asset security token issuer, wherein the digital asset security token database comprises a log of digital asset security tokens including: (i) a first set of digital asset addresses including a respective digital asset address for each respective digital asset security token holder; and (ii) a respective digital asset security token amount associated with each respective digital asset address, wherein each respective digital asset address of the first set of digital asset addresses is tied to a first distributed public transaction ledger maintained by a first plurality of geographically distributed computer systems in a first peer-to-peer network in the form of a first blockchain; (b) providing a stable value digital asset token database stored on the first distributed public transaction ledger maintained by the first plurality of geographically distributed computer systems in the first peer-to-peer network in the form of the first blockchain, wherein the stable value digital asset token database comprises a log of stable value digital asset tokens including: (i) a second set of digital asset addresses including a second respective digital asset address for each respective stable value digital asset token holder; (ii) a respective stable value digital asset token amount for each respective stable value digital asset token holder, wherein the stable value digital asset tokens are issued by a stable value digital asset token issuer using a digital asset exchange computer system associated with a digital asset exchange; (c) receiving, by the digital asset exchange computer system, a first request from the digital asset security token issuer system to purchase a first sum of stable value digital asset tokens in exchange for a second sum of a second digital asset, wherein the first sum corresponds to the second sum based on a fixed notional amount, wherein the second digital asset is maintained on a second distributed public transaction ledger maintained by a second plurality of geographically distributed computer systems in a second peer-to-peer network in the form of a second blockchain; (d) verifying, by the digital asset exchange computer system, the first request, including: (i) verifying, by the digital asset exchange computer system, that the digital asset security token issuer is a registered user of the digital asset exchange; and (ii) verifying, by the digital asset exchange computer system, that the digital asset security token issuer has at least the second sum of the second digital asset available for transaction with the digital asset exchange as reflected in a second digital asset electronic ledger of the digital asset exchange computer system; (e) accessing, by the digital asset exchange computer system, the digital asset security token database to determine: (i) each respective digital asset address of the first set of digital asset addresses on the first blockchain for each respective digital asset security token holder; and (ii) the respective digital asset security token amount associated with each respective digital asset address; (f) determining a respective payment amount in stable value digital asset tokens to be made to each respective digital asset address of the first set of digital asset addresses based at least in part on the fixed notional amount, the first sum of stable value digital asset tokens, and the respective digital asset security token amount associated with each respective digital asset address of the first set of digital asset addresses; (g) generating, by the digital asset exchange computer system, transaction instructions for the first sum of stable value digital asset tokens by updating the stable value digital asset token database to reflect the addition of new stable value digital asset tokens in the amount of the first sum and the corresponding digital asset addresses associated with each new stable value digital asset token and a digital signature based on a private key associated with the digital asset exchange; (h) transferring, by the digital asset exchange computer system, the first sum of the stable value digital asset on a stable value digital asset electronic ledger from the user account of the digital asset security token issuer, to a custodial account of the digital asset exchange associated with stable value digital asset tokens; (i) generating, by the digital asset exchange computer system to the first blockchain, transaction instructions associated with crediting the respective payment amount of stable value digital asset tokens to each respective digital asset address of the first set of digital asset addresses; (j) publishing, by the digital asset exchange computer system to the first blockchain, the transaction instructions associated with crediting the respective payment amount of stable value digital asset tokens to each respective digital asset address of the first set of digital asset addresses, where ownership of each digital asset security token associated with each respective digital asset security token amount remains the same; and (k) notifying, by the digital asset exchange computer system, each digital asset address of the first set of the digital asset addresses of each respective transfer of stable value digital asset tokens to each respective digital asset address of the first set of digital asset addresses.

In embodiments, verifying the first request further includes: (iii) verifying, by the digital asset exchange computer system, the second sum of the second digital asset is associated with a public address on the second blockchain associated with the digital asset security token issuer.

In embodiments, the first blockchain is an Ethereum network.

In embodiments, the second blockchain is a Bitcoin network.

In embodiments, the second blockchain is a Bitcoin Cash network.

In embodiments, the second blockchain is a Stellar network.

In embodiments, the second blockchain is a Filecoin network.

In embodiments, the second blockchain is a Litecoin network.

In embodiments, the second blockchain is a Tezos network.

In embodiments, the second blockchain is a Zcash network.

In embodiments, the first blockchain is a Neo Network.

In embodiments, the first blockchain is an Ether Classic network.

In embodiments, the digital asset exchange is a regulated digital asset exchange.

In embodiments, the digital asset security token is a security registered with a government authority.

In embodiments, the digital asset security token is a debt security and the electronic payments are interest.

In embodiments, the digital asset security token is an equity security and the electronic payments are dividends.

In embodiments, the digital asset security token is secured by intellectual property rights and the electronic payments are royalties.

In embodiments, the second blockchain is based on a mathematical protocol for proof of work.

In embodiments, the second blockchain is based on a mathematical protocol for proof of stake.

In embodiments, the second blockchain is based on a cryptographic mathematical protocol.

In embodiments, the method may further comprise a step of publishing, by the digital asset exchange computer system to a side ledger, the transaction instructions associated with crediting the respective payment amount of stable value digital asset tokens to each respective digital asset address of the first set of digital asset addresses and the publishing step (j) includes publishing the transaction instructions from the side ledger to the first distributed public asset ledger periodically or aperiodically.

In embodiments, the method may further comprise steps of: (1) receiving, at the digital asset security token issuer system, from at least one digital asset security token holder, a payment request prior to the receiving step (c), the payment request including: (i) a digital asset address of the at least one digital asset security token holder; and (ii) a request to transfer a payment amount of stable value digital asset tokens to the digital asset address of the at least one digital asset security token holder; (m) confirming, by the digital asset security token issuer system, that: (A) the digital asset address of the at least one digital asset security token holder is valid; (B) the digital asset security token amount of digital asset security tokens associated with the digital asset address of the at least one digital asset security token holder is more than zero; and (C) the at least one digital asset security token holder is entitled to payment; and (n) generating, at the digital asset security token issuer system, the first request based at least in part on the payment request when the digital asset address of the at least one digital asset security token holder is valid, the digital asset security token amount of digital asset security tokens associated with the digital asset address of the at least one digital asset security token holder is more than zero and the at least one digital asset security token holder is entitled to payment.

In embodiments, the first set of one or more computer readable media associated with the digital asset security token issuer system is operably connected to a node of the first plurality of geographically distributed computer systems in the first peer-to-peer network in the form of the first blockchain, wherein the node is maintained by the first digital asset security token issuer.

In embodiments, the digital asset security token database is maintained and stored on the first plurality of geographically distributed computer systems in the first peer-to-peer network in the form of the first blockchain.

In embodiments, the digital asset security token database is maintained on a sidechain, separate from the first blockchain, wherein information on the sidechain is published and stored on the first blockchain periodically or aperiodically.

In embodiments, the generating step (i) includes generating, by the digital asset exchange computer system, transaction instructions for the first sum of stable value digital asset tokens to update the stable value digital asset token database to reserve stable value digital asset tokens in the amount of the first sum.

In embodiments, the payment amount relates to a dividend to be paid based on ownership of each digital asset security token.

In embodiments, the payment amount relates to a royalty to be paid based on ownership of each digital asset security token.

In embodiments, the payment amount relates to interest to be paid based on ownership of each digital asset security token.

In embodiments, the digital signature is based on at least two private keys associated with the digital asset exchange.

In embodiments, the first request includes a first plurality of requests associated with a plurality of users, wherein each respective purchase request of the first plurality of purchase requests includes a respective request to purchase a respective sum stable value digital asset tokens.

In embodiments, the transaction instructions include a plurality of transaction instructions, each instruction being associated with a corresponding message including the digital signature based on the digital asset exchange private key.

In embodiments, the digital signature is based on at least two private keys associated with the digital asset exchange.

In embodiments, the first request is made by the first user device via a secure channel.

In embodiments, the first request is encrypted communication.

In embodiments, the first request is encrypted using an asymmetric key.

In embodiments, the asymmetric key is a PKI key.

In embodiments, the first request is encrypted using a symmetric key.

In embodiments, the first request is encrypted in accordance with Transport Layer Security protocol.

In embodiments, the first request is encrypted by the first user device.

In embodiments, the first request is encrypted by the digital asset exchange computer system.

In embodiments, each notification is encrypted.

In embodiments, each notification is encrypted using an asymmetric key.

In embodiments, the asymmetric key is a PKI key.

In embodiments, each notification is encrypted using a symmetric key.

In embodiments, each notification is encrypted in accordance with Transport Layer Security protocol.

In embodiments, each notification is encrypted by the first user device.

In embodiments, each notification is encrypted by the digital asset exchange computer system.

In embodiments, the stable value digital asset electronic ledger and the second digital asset electronic digital asset ledger are maintained by the digital asset exchange computer system.

In embodiments, the stable value digital asset electronic ledger and the second digital asset electronic digital asset ledger are maintained in a single database.

In embodiments, the stable value digital asset electronic ledger and the second digital asset electronic digital asset ledger are maintained in separate databases.

In embodiments, the transaction instructions include a digital signature based on a private key associated with the digital asset exchange computer system.

In embodiments, a method of issuing electronic payments using a stable value digital asset token on a digital asset security token may comprise the steps of: (a) providing a digital asset security token database stored on a first set of one or more computer readable media associated with a digital asset security token issuer system associated with a digital asset security token issuer, wherein the digital asset security token database comprises a log of digital asset security tokens including: (i) a first set of digital asset addresses including a respective digital asset address for each respective digital asset security token holder; and (ii) a respective digital asset security token amount associated with each respective digital asset address, wherein each respective digital asset address of the first set of digital asset addresses is tied to a first distributed public transaction ledger maintained by a first plurality of geographically distributed computer systems in a first peer-to-peer network in the form of a first blockchain; (b) providing a stable value digital asset token database stored on the first distributed public transaction ledger maintained by the first plurality of geographically distributed computer systems in the first peer-to-peer network in the form of the first blockchain, wherein the stable value digital asset token database comprises a log of stable value digital asset tokens including: (i) a second set of digital asset addresses including a second respective digital asset address for each respective stable value digital asset token holder; (ii) a respective stable value digital asset token amount for each respective stable value digital asset token holder, wherein the stable value digital asset tokens are issued by a stable value digital asset token issuer using a digital asset token issuer computer system associated with a digital asset token issuer; (c) receiving, by the digital asset token issuer computer system, a first request from the digital asset security token issuer system to purchase a first sum of stable value digital asset tokens in exchange for a second sum of a second digital asset, wherein the first sum corresponds to the second sum based on a fixed notional amount, wherein the second digital asset is maintained on a second distributed public transaction ledger maintained by a second plurality of geographically distributed computer systems in a second peer-to-peer network in the form of a second blockchain; (d) verifying, by the digital asset token issuer computer system, the first request, including: (i) verifying, by the digital asset token issuer computer system, that the digital asset security token issuer is a registered user of the digital asset token issuer; and (ii) verifying, by the digital asset token issuer computer system, that the digital asset security token issuer has at least the second sum of the second digital asset available for transaction with the digital asset token issuer as reflected in a second digital asset electronic ledger of the digital asset token issuer computer system; (e) accessing, by the digital asset token issuer computer system, the digital asset security token database to determine: (i) each respective digital asset address of the first set of digital asset addresses on the first blockchain for each respective digital asset security token holder; and (ii) the respective digital asset security token amount associated with each respective digital asset address;

(l) determining a respective payment amount in stable value digital asset tokens to be made to each respective digital asset address of the first set of digital asset addresses based at least in part on the fixed notional amount, the first sum of stable value digital asset tokens, and the respective digital asset security token amount associated with each respective digital asset address of the first set of digital asset addresses; (m) generating, by the digital asset token issuer computer system, transaction instructions for the first sum of stable value digital asset tokens by updating the stable value digital asset token database to reflect the addition of new stable value digital asset tokens in the amount of the first sum and the corresponding digital asset addresses associated with each new stable value digital asset token and a digital signature based on a private key associated with the digital asset token issuer; (n) transferring, by the digital asset token issuer computer system, the first sum of the stable value digital asset on a stable value digital asset electronic ledger from the user account of the digital asset security token issuer, to a custodial account of the digital asset token issuer associated with stable value digital asset tokens; (o) generating, by the digital asset token issuer computer system to the first blockchain, transaction instructions associated with crediting the respective payment amount of stable value digital asset tokens to each respective digital asset address of the first set of digital asset addresses; (p) publishing, by the digital asset token issuer computer system to the first blockchain, the transaction instructions associated with crediting the respective payment amount of stable value digital asset tokens to each respective digital asset address of the first set of digital asset addresses, where ownership of each digital asset security token associated with each respective digital asset security token amount remains the same; and (q) notifying, by the digital asset token issuer computer system, each digital asset address of the first set of the digital asset addresses of each respective transfer of stable value digital asset tokens to each respective digital asset address of the first set of digital asset addresses.

In embodiments, the first blockchain is an Ethereum network.

In embodiments, the second blockchain is a Bitcoin network.

In embodiments, the second blockchain is a Bitcoin Cash network.

In embodiments, the second blockchain is a Stellar network.

In embodiments, the second blockchain is a Filecoin network.

In embodiments, the second blockchain is a Litecoin network.

In embodiments, the second blockchain is a Tezos network.

In embodiments, the second blockchain is a Zcash network.

In embodiments, the first blockchain is a Neo Network.

In embodiments, the first blockchain is an Ether Classic network.

In embodiments, the digital asset exchange is a regulated digital asset exchange.

In embodiments, the digital asset security token is a security registered with a government authority.

In embodiments, the digital asset security token is a debt security and the electronic payments are interest.

In embodiments, the digital asset security token is an equity security and the electronic payments are dividends.

In embodiments, the digital asset security token is secured by intellectual property rights and the electronic payments are royalties.

In embodiments, the second blockchain is based on a mathematical protocol for proof of work.

In embodiments, the second blockchain is based on a mathematical protocol for proof of stake.

In embodiments, the second blockchain is based on a cryptographic mathematical protocol.

In embodiments, the method may further comprise a step of publishing, by the digital asset token issuer computer system to a side ledger, the transaction instructions associated with crediting the respective payment amount of stable value digital asset tokens to each respective digital asset address of the first set of digital asset addresses and the publishing step (j) includes publishing the transaction instructions from the side ledger to the first distributed public asset ledger periodically or aperiodically.

In embodiments, the method may further comprise steps of: (l) receiving, at the digital asset security token issuer system, from at least one digital asset security token holder, a payment request prior to the receiving step (c), the payment request including: (i) a digital asset address of the at least one digital asset security token holder; and (ii) a request to transfer a payment amount of stable value digital asset tokens to the digital asset address of the at least one digital asset security token holder; (m) confirming, by the digital asset security token issuer system, that: (A) the digital asset address of the at least one digital asset security token holder is valid; (B) the digital asset security token amount of digital asset security tokens associated with the digital asset address of the at least one digital asset security token holder is more than zero; and (C) the at least one digital asset security token holder is entitled to payment; and (n) generating, at the digital asset security token issuer system, the first request based at least in part on the payment request when the digital asset address of the at least one digital asset security token holder is valid, the digital asset security token amount of digital asset security tokens associated with the digital asset address of the at least one digital asset security token holder is more than zero and the at least one digital asset security token holder is entitled to payment.

In embodiments, the first set of one or more computer readable media associated with the digital asset security token issuer system is operably connected to a node of the first plurality of geographically distributed computer systems in the first peer-to-peer network in the form of the first blockchain, wherein the node is maintained by the first digital asset security token issuer.

In embodiments, the digital asset security token database is maintained and stored on the first plurality of geographically distributed computer systems in the first peer-to-peer network in the form of the first blockchain.

In embodiments, the digital asset security token database is maintained on a sidechain, separate from the first blockchain, wherein information on the sidechain is published and stored on the first blockchain periodically or aperiodically.

In embodiments, the generating step (i) includes generating, by the digital asset token issuer computer system, transaction instructions for the first sum of stable value digital asset tokens to update the stable value digital asset token database to reserve stable value digital asset tokens in the amount of the first sum.

In embodiments, the payment amount relates to a dividend to be paid based on ownership of each digital asset security token.

In embodiments, the payment amount relates to a royalty to be paid based on ownership of each digital asset security token.

In embodiments, the payment amount relates to interest to be paid based on ownership of each digital asset security token.

In embodiments, the digital signature is based on at least two private keys associated with the digital asset token issuer.

In embodiments, the first request includes a first plurality of requests associated with a plurality of users, wherein each respective purchase request of the first plurality of purchase requests includes a respective request to purchase a respective sum stable value digital asset tokens.

In embodiments, the transaction instructions include a plurality of transaction instructions, each instruction being associated with a corresponding message including the digital signature based on the digital asset token issuer private key.

In embodiments, the digital signature is based on at least two private keys associated with the digital asset token issuer.

In embodiments, the first request is made by the first user device via a secure channel.

In embodiments, the first request is encrypted communication.

In embodiments, the first request is encrypted using an asymmetric key.

In embodiments, the asymmetric key is a PKI key.

In embodiments, the first request is encrypted using a symmetric key.

In embodiments, the first request is encrypted in accordance with Transport Layer Security protocol.

In embodiments, the first request is encrypted by the first user device.

In embodiments, the first request is encrypted by the digital asset token issuer computer system.

In embodiments, each notification is encrypted.

In embodiments, each notification is encrypted using an asymmetric key.

In embodiments, the asymmetric key is a PKI key.

In embodiments, each notification is encrypted using a symmetric key.

In embodiments, each notification is encrypted in accordance with Transport Layer Security protocol.

In embodiments, each notification is encrypted by the first user device.

In embodiments, each notification is encrypted by the digital asset token issuer computer system.

In embodiments, the stable value digital asset electronic ledger and the second digital asset electronic digital asset ledger are maintained by the digital asset token issuer computer system.

In embodiments, the stable value digital asset electronic ledger and the second digital asset electronic digital asset ledger are maintained in a single database.

In embodiments, the stable value digital asset electronic ledger and the second digital asset electronic digital asset ledger are maintained in separate databases.

In embodiments, the transaction instructions include a digital signature based on a private key associated with the digital asset token issuer computer system.

In embodiments, a method may comprise the steps of: (a) authenticating, by an administrator computer system associated with an administrator, an access request by a first user device associated with a first user, to the administrator computer system, comprising the steps of: (1) receiving, by the administrator computer system from the first user device, an authentication request including first user credential information associated with the first user; (2) determining, by the administrator computer system, that the first user device is authorized to access the administrator computer system based at least in part on the first user credential information; (3) generating, by the administrator computer system, first graphical user interface information for displaying a first graphical user interface on the first user device; (4) transmitting, from the administrator computer system to the first user device, the first graphical user interface information; (b) obtaining, by the digital asset computer system from the first user device, a withdraw request, comprising the steps of: (1) receiving, by the administrator computer system from the first user device, a first electronic request to withdraw stable value digital asset tokens, wherein the stable value digital asset token is maintained on a first distributed public transaction ledger in the form of a first blockchain associated with a first underlying digital asset that is maintained by a first blockchain network including a first plurality of geographically distributed computer systems in a first peer-to-peer network, and each stable value digital asset token is issued based on first smart contract instructions provided at a first contract address on the blockchain; (2) in response to the first electronic request, obtaining, by the administrator computer system from a digital asset account ledger database stored on computer readable member accessible by the administrator computer system, first account balance information of the first user indicating a first amount of a second digital asset for the first user held by the administrator on behalf of the first user, wherein the second digital asset is maintained on a second distributed public transaction ledger in the form of a second blockchain associated with a second underlying digital asset that is maintained by a second blockchain network including a second plurality of geographically distributed computer systems in a second peer-to-peer network; (3) generating, by the administrator computer system, second graphical user interface information including at least the first account balance information; (4) transmitting, by the administrator computer system to the first user device, the second graphical user interface information; and (5) receiving, by the administrator computer system from the first user device, a second electronic withdrawal request comprising at least: (A) a first amount of stable value digital asset tokens to be withdrawn; and (B) a destination address on the underlying blockchain to which the first amount of stable value digital asset tokens is provided; (c) processing, by the administrator computer system, the withdraw request by the steps of: (1) calculating, by the administrator computer system, a second amount of second digital asset based on the first amount of stable value digital asset tokens, where the second amount of second digital asset is determined using a fixed predetermined ratio of stable value digital asset tokens to second digital asset; (2) determining, by the administrator computer system, that the second amount of second digital asset is less than the first amount of the second digital asset of the first user; (3) in the case where the second amount of second digital asset is less than the first amount of the second digital asset of the first user, determining a third amount of second digital asset associated with an updated amount of available second digital asset of the first user, wherein the third amount of second digital asset equals the first amount of the second digital asset of the first user less the second amount of second digital asset; (4) updating, by the administrator computer system, the second digital asset account ledger database to reflect that the updated amount of available second digital asset of the first user is the third amount of second digital asset; (5) updating, by the administrator computer system, a stable value digital asset token issuer second digital asset ledger, to increase a balance of second digital asset by the second amount of second digital asset; (6) generating, by the administrator computer system, a first transaction request for the blockchain, from a first administrator public key address on the blockchain, which is mathematically related to a first administrator private key, which is stored in the computer readable member accessible by the administrator computer system, to the first contract address associated with a stable value digital asset token issuer, and including a first message including: i. a request to generate and provide the first amount of stable value digital asset tokens to the destination public address of the first user; and ii. a digital signature generated using the administrator private key, and (7) transmitting, by the administrator computer system to the blockchain network via the Internet, the first transaction request, wherein, in response to the first message in the first transaction request, the blockchain network verifies the digital signature and executes the request to generate and provide the first amount of stable value tokens to the destination public address of the first user; and (8) confirming, by the administrator computer system based on reference to the blockchain, that the first transaction request has been processed by the blockchain network so that the balance of stable value digital asset tokens in the destination public address of the first user includes the first amount of stable value digital asset tokens.

In embodiments, the determining in (a)(2) further determines that the first user is a registered user of the administrator.

In embodiments, the first underlying digital asset is ether and the first blockchain is the Ethereum Blockchain.

In embodiments, the second blockchain is the Bitcoin network.

In embodiments, the second blockchain is the Bitcoin Cash network.

In embodiments, the second blockchain is the Stellar network.

In embodiments, the second blockchain is the Filecoin network.

In embodiments, the second blockchain is the Litecoin network.

In embodiments, the second blockchain is the Tezos network.

In embodiments, the second blockchain is the Zcash network.

In embodiments, the second blockchain is the Neo Network.

In embodiments, the second blockchain is the Ether Classic network.

In embodiments, the underlying digital asset is Neo and the blockchain is the Neo Blockchain.

In embodiments, the second digital asset is Bitcoin.

In embodiments, the second digital asset is Litecoin.

In embodiments, the second digital asset is Bitcoin Cash.

In embodiments, the second digital asset is Filecoin.

In embodiments, the second digital asset is Zcash.

In embodiments, the second digital asset is Stellar.

In embodiments, the second digital asset is Polkadot.

In embodiments, the second digital asset is Atom.

In embodiments, the second digital asset is Tezos.

In embodiments, the updating in (c)(5) further comprises transferring the second amount of second digital asset from an administrator second digital asset account to a stable value digital asset token issuer second digital asset account.

In embodiments, the updating in (c)(5) further comprises periodically transferring second digital asset between the administrator second digital asset account and the stable value digital asset token issuer second digital asset account.

In embodiments, the request to obtain in the destination public address of the first user the first amount of stable value digital asset tokens includes a request to generate the first amount of stable value digital asset tokens at the destination public address of the first user.

In embodiments, the request to obtain in the destination public address of the first user the first amount of stable value digital asset tokens includes a request to transfer the first amount of stable value digital asset tokens from a stable value digital asset token issuer public address to the destination public address of the first user.

In embodiments, a method may comprise the steps of: (a) authenticating, by a digital asset exchange computer system associated with a digital asset exchange, an access request by a first user device associated with a first user, to the digital asset exchange computer system, comprising the steps of: (1) receiving, by the digital asset exchange computer system from the first user device, an authentication request including first user credential information associated with the first user; (2) determining, by the digital asset exchange computer system, that the first user device is authorized to access the digital asset exchange computer system based at least in part on the first user credential information; (3) generating, by the digital asset exchange computer system, first graphical user interface information for displaying a first graphical user interface on the first user device; (4) transmitting, from the digital asset exchange computer system to the first user device, the first graphical user interface information; (b) obtaining, by the digital asset computer system from the first user device, a withdraw request, comprising the steps of: (1) receiving, by the digital asset exchange computer system from the first user device, a first electronic request to withdraw stable value digital asset tokens, wherein the stable value digital asset token is maintained on a first distributed public transaction ledger in the form of a first blockchain associated with a first underlying digital asset that is maintained by a first blockchain network including a first plurality of geographically distributed computer systems in a first peer-to-peer network, and each stable value digital asset token is issued based on first smart contract instructions provided at a first contract address on the blockchain; (2) in response to the first electronic request, obtaining, by the digital asset exchange computer system from a digital asset account ledger database stored on computer readable member accessible by the digital asset exchange computer system, first account balance information of the first user indicating a first amount of a second digital asset for the first user held by the digital asset exchange on behalf of the first user, wherein the second digital asset is maintained on a second distributed public transaction ledger in the form of a second blockchain associated with a second underlying digital asset that is maintained by a second blockchain network including a second plurality of geographically distributed computer systems in a second peer-to-peer network; (3) generating, by the digital asset exchange computer system, second graphical user interface information including at least the first account balance information; (4) transmitting, by the digital asset exchange computer system to the first user device, the second graphical user interface information; and (5) receiving, by the digital asset exchange computer system from the first user device, a second electronic withdrawal request comprising at least: (A) a first amount of stable value digital asset tokens to be withdrawn; and (B) a destination address on the underlying blockchain to which the first amount of stable value digital asset tokens is provided; (c) processing, by the digital asset exchange computer system, the withdraw request by the steps of: (1) calculating, by the digital asset exchange computer system, a second amount of second digital asset based on the first amount of stable value digital asset tokens, where the second amount of second digital asset is determined using a fixed predetermined ratio of stable value digital asset tokens to second digital asset; (2) determining, by the digital asset exchange computer system, that the second amount of second digital asset is less than the first amount of second digital asset of the first user; (3) in the case where the second amount of second digital asset is less than the first amount of currency of the first user, determining a third amount of currency associated with an updated amount of currency of the first user, wherein the third amount of currency equals the first amount of currency of the first user less the second amount of currency; (4) updating, by the digital asset exchange computer system, the currency account ledger database to reflect that the updated amount of second digital asset of the first user is the third amount of second digital asset; (5) updating, by the digital asset exchange computer system, a stable value digital asset token issuer second digital asset ledger, to increase a balance of second digital asset by the second amount of second digital asset; (6) generating, by the digital asset exchange computer system, a first transaction request for the blockchain, from a first digital asset exchange public key address on the blockchain, which is mathematically related to a first digital asset exchange private key, which is stored in the computer readable member accessible by the digital asset exchange computer system, to the first contract address associated with a stable value digital asset token issuer, and including a first message including: i. a request to generate and provide the first amount of stable value digital asset tokens to the destination public address of the first user; and ii. a digital signature generated using the digital asset exchange private key, and (7) transmitting, by the digital asset exchange computer system to the blockchain network via the Internet, the first transaction request, wherein, in response to the first message in the first transaction request, the blockchain network verifies the digital signature and executes the request to generate and provide the first amount of stable value tokens to the destination public address of the first user; and (8) confirming, by the digital asset exchange computer system based on reference to the blockchain, that the first transaction request has been processed by the blockchain network so that the balance of stable value digital asset tokens in the destination public address of the first user includes the first amount of stable value digital asset tokens.

In embodiments, the determining in (a)(2) further determines that the first user is a registered user of the digital asset exchange.

In embodiments, the digital asset exchange is licensed by a government regulatory authority.

In embodiments, the first underlying digital asset is Ether and the first blockchain is the Ethereum Blockchain.

In embodiments, the second blockchain is the Bitcoin network.

In embodiments, the second blockchain is the Bitcoin Cash network.

In embodiments, the second blockchain is the Stellar network.

In embodiments, the second blockchain is the Filecoin network.

In embodiments, the second blockchain is the Litecoin network.

In embodiments, the second blockchain is the Tezos network.

In embodiments, the second blockchain is the Zcash network.

In embodiments, the second blockchain is the Neo Network.

In embodiments, the second blockchain is the Ether Classic network.

In embodiments, the first underlying digital asset is Neo and the first blockchain is the Neo Blockchain.

In embodiments, the second digital asset is Bitcoin.

In embodiments, the second digital asset is Litecoin.

In embodiments, the second digital asset is Bitcoin Cash.

In embodiments, the second digital asset is Filecoin.

In embodiments, the second digital asset is Zcash.

In embodiments, the second digital asset is Stellar.

In embodiments, the second digital asset is Polkadot.

In embodiments, the second digital asset is Atom.

In embodiments, the second digital asset is Tezos.

In embodiments, the updating in (c)(5) further comprises transferring the second amount of currency from a digital asset exchange currency account to a stable value digital asset token issuer currency account.

In embodiments, the updating in (c)(5) further comprises periodically transferring currency between the digital asset exchange currency account and the stable value digital asset token issuer currency account.

In embodiments, the request to obtain in the destination public address of the first user the first amount of stable value digital asset tokens includes a request to generate the first amount of stable value digital asset tokens at the destination public address of the first user.

In embodiments, the request to obtain in the destination public address of the first user the first amount of stable value digital asset tokens includes a request to generate the first amount of stable value digital asset tokens at the destination public address of the first user.

In embodiments, a method may comprise the steps of: (a) authenticating, by a digital asset token issuer computer system associated with a digital asset token issuer, an access request by a first user device associated with a first user, to the digital asset token issuer computer system, comprising the steps of: (1) receiving, by the digital asset token issuer computer system from the first user device, an authentication request including first user credential information associated with the first user; (2) determining, by the digital asset token issuer computer system, that the first user device is authorized to access the digital asset token issuer computer system based at least in part on the first user credential information; (3) generating, by the digital asset token issuer computer system, first graphical user interface information for displaying a first graphical user interface on the first user device; (4) transmitting, from the digital asset token issuer computer system to the first user device, the first graphical user interface information; (b) obtaining, by the digital asset computer system from the first user device, a withdraw request, comprising the steps of: (1) receiving, by the digital asset token issuer computer system from the first user device, a first electronic request to withdraw stable value digital asset tokens, wherein the stable value digital asset token is maintained on a distributed public transaction ledger in the form of a blockchain associated with an underlying digital asset that is maintained by a blockchain network including a plurality of geographically distributed computer systems in a peer-to-peer network, and each stable value digital asset token is issued based on first smart contract instructions provided at a first contract address on the blockchain; (2) in response to the first electronic request, obtaining, by the digital asset token issuer computer system from a second digital asset account ledger database stored on computer readable member accessible by the digital asset token issuer computer system, first account balance information of the first user indicating a first amount of a second digital asset for the first user held by the digital asset token issuer on behalf of the first user, wherein the second digital asset is maintained on a second distributed public transaction ledger in the form of a second blockchain associated with a second underlying digital asset that is maintained by a second blockchain network including a second plurality of geographically distributed computer systems in a second peer-to-peer network; (3) generating, by the digital asset token issuer computer system, second graphical user interface information including at least the first account balance information: (4) transmitting, by the digital asset token issuer computer system to the first user device, the second graphical user interface information; and (5) receiving, by the digital asset token issuer computer system from the first user device, a second electronic withdrawal request comprising at least: (A) a first amount of stable value digital asset tokens to be withdrawn; and (B) a destination address on the underlying blockchain to which the first amount of stable value digital asset tokens is provided; (c) processing, by the digital asset token issuer computer system, the withdraw request by the steps of: (1) calculating, by the digital asset token issuer computer system, a second amount of second digital asset based on the first amount of stable value digital asset tokens, where the second amount of second digital asset is determined using a fixed predetermined ratio of stable value digital asset tokens to second digital asset; (2) determining, by the digital asset token issuer computer system, that the second amount of second digital asset is less than the first amount of second digital asset of the first user; (3) in the case where the second amount of second digital asset is less than the first amount of second digital asset of the first user, determining a third amount of second digital asset associated with an updated amount of second digital asset of the first user, wherein the third amount of second digital asset equals the first amount of second digital asset of the first user less the second amount of second digital asset; (4) updating, by the digital asset token issuer computer system, the second digital asset account ledger database to reflect that the updated amount of second digital asset of the first user is the third amount of second digital asset; (5) updating, by the digital asset token issuer computer system, a stable value digital asset token issuer second digital asset ledger, to increase a balance of second digital asset by the second amount of second digital asset; (6) generating, by the digital asset token issuer computer system, a first transaction request for the blockchain, from a first digital asset token issuer public key address on the blockchain, which is mathematically related to a first digital asset token issuer private key, which is stored in the computer readable member accessible by the digital asset token issuer computer system, to the first contract address associated with a stable value digital asset token issuer, and including a first message including: i. a request to generate and provide the first amount of stable value digital asset tokens to the destination public address of the first user; and ii. a digital signature generated using the digital asset token issuer private key, and (7) transmitting, by the digital asset token issuer computer system to the blockchain network via the Internet, the first transaction request, wherein, in response to the first message in the first transaction request, the blockchain network verifies the digital signature and executes the request to generate and provide the first amount of stable value tokens to the destination public address of the first user; and (8) confirming, by the digital asset token issuer computer system based on reference to the blockchain, that the first transaction request has been processed by the blockchain network so that the balance of stable value digital asset tokens in the destination public address of the first user includes the first amount of stable value digital asset tokens.

In embodiments, the determining in (a)(2) further determines that the first user is a registered user of the digital asset token issuer.

In embodiments, the digital asset token issuer is licensed by a government regulatory authority.

In embodiments, the first underlying digital asset is Ether and the blockchain is the Ethereum Blockchain.

In embodiments, the second blockchain is the Bitcoin network.

In embodiments, the second blockchain is the Bitcoin Cash network.

In embodiments, the second blockchain is the Stellar network.

In embodiments, the second blockchain is the Filecoin network.

In embodiments, the second blockchain is the Litecoin network.

In embodiments, the second blockchain is the Tezos network.

In embodiments, the second blockchain is the Zcash network.

In embodiments, the second blockchain is the Neo Network.

In embodiments, the second blockchain is the Ether Classic network.

In embodiments, the first underlying digital asset is neo and the first blockchain is the Neo Blockchain.

In embodiments, the second digital asset is Bitcoin.

In embodiments, the second digital asset is Litecoin.

In embodiments, the second digital asset is Bitcoin Cash.

In embodiments, the second digital asset is Filecoin.

In embodiments, the second digital asset is Zcash.

In embodiments, the second digital asset is Stellar.

In embodiments, the second digital asset is Polkadot.

In embodiments, the second digital asset is Atom.

In embodiments, the second digital asset is Tezos.

In embodiments, the updating in (c)(5) further comprises transferring the second amount of second digital asset from a digital asset token issuer second digital asset account to a stable value digital asset token issuer second digital asset account.

In embodiments, the updating in (c)(5) further comprises periodically transferring second digital asset between the digital asset token issuer second digital asset account and the stable value digital asset token issuer second digital asset account.

In embodiments, the request to obtain in the destination public address of the first user the first amount of stable value digital asset tokens includes a request to generate the first amount of stable value digital asset tokens at the destination public address of the first user.

In embodiments, the request to obtain in the destination public address of the first user the first amount of stable value digital asset tokens includes a request to transfer the first amount of stable value digital asset tokens from a stable value digital asset token issuer public address to the destination public address of the first user.

In embodiments, a method may comprise the steps of: (a) authenticating, by an administrator computer system associated with an administrator, an access request by a first user device associated with a first user, to the administrator computer system, comprising the steps of: (1) receiving, by the administrator computer system from the first user device, an authentication request including first user credential information associated with the first user; (2) determining, by the administrator computer system, that the first user device is authorized to access the administrator computer system based at least in part on the first user credential information, (3) generating, by the administrator computer system, first graphical user interface information for displaying a first graphical user interface on the first user device; (4) transmitting, from the administrator computer system to the first user device, the first graphical user interface information; (b) obtaining, by the digital asset computer system from the first user device, a withdraw request, comprising the steps of: (1) receiving, by the administrator computer system from the first user device, a first electronic request to withdraw stable value digital asset tokens, wherein the stable value digital asset token is maintained on a distributed public transaction ledger in the form of a blockchain associated with an underlying digital asset that is maintained by a blockchain network including a plurality of geographically distributed computer systems in a peer-to-peer network, and each stable value digital asset token is issued based on first smart contract instructions provided at a first contract address on the blockchain; (2) in response to the first electronic request, obtaining, by the administrator computer system from a currency account ledger database stored on computer readable member accessible by the administrator computer system, first account balance information of the first user indicating a first amount of available currency for the first user held by the administrator on behalf of the first user; (3) generating, by the administrator computer system, second graphical user interface information including at least the first account balance information; (4) transmitting, by the administrator computer system to the first user device, the second graphical user interface information; and (5) receiving, by the administrator computer system from the first user device, a second electronic withdrawal request comprising at least: (A) a first amount of stable value digital asset tokens to be withdrawn; and (B) a destination address on the underlying blockchain to which the first amount of stable value digital asset tokens is provided; (c) processing, by the administrator computer system, the withdraw request by the steps of: (1) calculating, by the administrator computer system, a second amount of currency based on the first amount of stable value digital asset tokens, where the second amount of currency is determined using a fixed predetermined ratio of stable value digital asset tokens to currency; (2) determining, by the administrator computer system, that the second amount of currency is less than the first amount of available currency of the first user; (3) in the case where the second amount of currency is less than the first amount of available currency of the first user, determining a third amount of currency associated with an updated amount of available currency of the first user, wherein the third amount of currency equals the first amount of available currency of the first user less the second amount of currency; (4) updating, by the administrator computer system, the currency account ledger database to reflect that the updated amount of available currency of the first user is the third amount of currency; (5) updating, by the administrator computer system, a stable value digital asset token issuer currency ledger, to increase a balance of currency by the second amount of currency; (6) generating, by the administrator computer system, a first transaction request for the blockchain, from a first administrator public key address on the blockchain, which is mathematically related to a first administrator private key, which is stored in the computer readable member accessible by the administrator computer system, to the first contract address associated with a stable value digital asset token issuer, and including a first message including: i. a request to generate and provide the first amount of stable value digital asset tokens to the destination public address of the first user; and ii. a digital signature generated using the administrator private key, and (7) transmitting, by the administrator computer system to the blockchain network via the Internet, the first transaction request, wherein, in response to the first message in the first transaction request, the blockchain network verifies the digital signature and executes the request to generate and provide the first amount of stable value tokens to the destination public address of the first user; and (8) confirming, by the administrator computer system based on reference to the blockchain, that the first transaction request has been processed by the blockchain network so that the balance of stable value digital asset tokens in the destination public address of the first user includes the first amount of stable value digital asset tokens.

In embodiments, the determining in (a)(2) further determines that the first user is a registered user of the administrator.

In embodiments, the underlying digital asset is ether and the blockchain is the Ethereum Blockchain.

In embodiments, the underlying digital asset is neo and the blockchain is the Neo Blockchain.

In embodiments, the currency is a flat currency.

In embodiments, the fiat currency is U.S. dollar.

In embodiments, the fixed predetermined ratio is one stable value digital asset token is equal to one U.S. dollar.

In embodiments, the fixed predetermined ratio is one hundred stable value digital asset tokens is equal to one U.S. dollar.

In embodiments, the fiat currency is GB pound.

In embodiments, the fiat currency is SG dollar.

In embodiments, the fiat currency is EUR.

In embodiments, the fiat currency is HK dollar.

In embodiments, the fiat currency is Canadian dollar.

In embodiments, the fiat currency is Australian dollar.

In embodiments, the fiat currency is Yen.

In embodiments, the currency is a cryptocurrency.

In embodiments, the cryptocurrency is Bitcoin.

In embodiments, the cryptocurrency is Litecoin.

In embodiments, the cryptocurrency is Bitcoin Cash.

In embodiments, the cryptocurrency is Filecoin.

In embodiments, the cryptocurrency is Zcash.

In embodiments, the cryptocurrency is Stellar.

In embodiments, the cryptocurrency is Polkadot.

In embodiments, the cryptocurrency is Atom.

In embodiments, the cryptocurrency is Tezos.

In embodiments, the updating in (c)(5) further comprises transferring the second amount of currency from an administrator currency account to a stable value digital asset token issuer currency account.

In embodiments, the updating in (c)(5) further comprises periodically transferring currency between the administrator currency account and the stable value digital asset token issuer currency account.

In embodiments, the request to obtain in the destination public address of the first user the first amount of stable value digital asset tokens includes a request to generate the first amount of stable value digital asset tokens at the destination public address of the first user.

In embodiments, the request to obtain in the destination public address of the first user the first amount of stable value digital asset tokens includes a request to transfer the first amount of stable value digital asset tokens from a stable value digital asset token issuer public address to the destination public address of the first user.

In embodiments, a method may comprise the steps of: (a) authenticating, by a digital asset exchange computer system associated with a digital asset exchange, an access request by a first user device associated with a first user, to the digital asset exchange computer system, comprising the steps of: (1) receiving, by the digital asset exchange computer system from the first user device, an authentication request including first user credential information associated with the first user; (2) determining, by the digital asset exchange computer system, that the first user device is authorized to access the digital asset exchange computer system based at least in part on the first user credential information; (3) generating, by the digital asset exchange computer system, first graphical user interface information for displaying a first graphical user interface on the first user device; (4) transmitting, from the digital asset exchange computer system to the first user device, the first graphical user interface information; (b) obtaining, by the digital asset computer system from the first user device, a withdraw request, comprising the steps of: (1) receiving, by the digital asset exchange computer system from the first user device, a first electronic request to withdraw stable value digital asset tokens, wherein the stable value digital asset token is maintained on a distributed public transaction ledger in the form of a blockchain associated with an underlying digital asset that is maintained by a blockchain network including a plurality of geographically distributed computer systems in a peer-to-peer network, and each stable value digital asset token is issued based on first smart contract instructions provided at a first contract address on the blockchain; (2) in response to the first electronic request, obtaining, by the digital asset exchange computer system from a currency account ledger database stored on computer readable member accessible by the digital asset exchange computer system, first account balance information of the first user indicating a first amount of available currency for the first user held by the digital asset exchange on behalf of the first user; (3) generating, by the digital asset exchange computer system, second graphical user interface information including at least the first account balance information; (4) transmitting, by the digital asset exchange computer system to the first user device, the second graphical user interface information; and (5) receiving, by the digital asset exchange computer system from the first user device, a second electronic withdrawal request comprising at least: (A) a first amount of stable value digital asset tokens to be withdrawn; and (B) a destination address on the underlying blockchain to which the first amount of stable value digital asset tokens is provided; (c) processing, by the digital asset exchange computer system, the withdraw request by the steps of: (1) calculating, by the digital asset exchange computer system, a second amount of currency based on the first amount of stable value digital asset tokens, where the second amount of currency is determined using a fixed predetermined ratio of stable value digital asset tokens to currency; (2) determining, by the digital asset exchange computer system, that the second amount of currency is less than the first amount of available currency of the first user; (3) in the case where the second amount of currency is less than the first amount of available currency of the first user, determining a third amount of currency associated with an updated amount of available currency of the first user, wherein the third amount of currency equals the first amount of available currency of the first user less the second amount of currency; (4) updating, by the digital asset exchange computer system, the currency account ledger database to reflect that the updated amount of available currency of the first user is the third amount of currency; (5) updating, by the digital asset exchange computer system, a stable value digital asset token issuer currency ledger, to increase a balance of currency by the second amount of currency; (6) generating, by the digital asset exchange computer system, a first transaction request for the blockchain, from a first digital asset exchange public key address on the blockchain, which is mathematically related to a first digital asset exchange private key, which is stored in the computer readable member accessible by the digital asset exchange computer system, to the first contract address associated with a stable value digital asset token issuer, and including a first message including: i. a request to generate and provide the first amount of stable value digital asset tokens to the destination public address of the first user; and ii. a digital signature generated using the digital asset exchange private key, and (7) transmitting, by the digital asset exchange computer system to the blockchain network via the Internet, the first transaction request, wherein, in response to the first message in the first transaction request, the blockchain network verifies the digital signature and executes the request to generate and provide the first amount of stable value tokens to the destination public address of the first user; and (8) confirming, by the digital asset exchange computer system based on reference to the blockchain, that the first transaction request has been processed by the blockchain network so that the balance of stable value digital asset tokens in the destination public address of the first user includes the first amount of stable value digital asset tokens.

In embodiments, the determining in (a)(2) further determines that the first user is a registered user of the digital asset exchange.

In embodiments,

In embodiments, the digital asset exchange is licensed by a government regulatory authority.

In embodiments, the underlying digital asset is ether and the blockchain is the Ethereum Blockchain.

In embodiments, the underlying digital asset is neo and the blockchain is the Neo Blockchain.

In embodiments, the currency is a fiat currency.

In embodiments, the fiat currency is U.S. dollar.

In embodiments, the fixed predetermined ratio is one stable value digital asset token is equal to one U.S. dollar.

In embodiments, the fixed predetermined ratio is one hundred stable value digital asset tokens is equal to one U.S. dollar.

In embodiments, the fiat currency is GB pound.

In embodiments, the fiat currency is SG dollar.

In embodiments, the fiat currency is EUR.

In embodiments, the fiat currency is HK dollar.

In embodiments, the fiat currency is Canadian dollar.

In embodiments, the fiat currency is Australian dollar.

In embodiments, the fiat currency is Yen.

In embodiments, the currency is a cryptocurrency.

In embodiments, the cryptocurrency is Bitcoin.

In embodiments, the cryptocurrency is Litecoin.

In embodiments, the cryptocurrency is Bitcoin Cash.

In embodiments, the cryptocurrency is Filecoin.

In embodiments, the cryptocurrency is Zcash.

In embodiments, the cryptocurrency is Stellar.

In embodiments, the cryptocurrency is Polkadot.

In embodiments, the cryptocurrency is Atom.

In embodiments, the cryptocurrency is Tezos.

In embodiments, the updating in (c)(5) further comprises transferring the second amount of currency from a digital asset exchange currency account to a stable value digital asset token issuer currency account.

In embodiments, the updating in (c)(5) further comprises periodically transferring currency between the digital asset exchange currency account and the stable value digital asset token issuer currency account.

In embodiments, the request to obtain in the destination public address of the first user the first amount of stable value digital asset tokens includes a request to generate the first amount of stable value digital asset tokens at the destination public address of the first user.

In embodiments, the request to obtain in the destination public address of the first user the first amount of stable value digital asset tokens includes a request to transfer the first amount of stable value digital asset tokens from a stable value digital asset token issuer public address to the destination public address of the first user.

In embodiments, a method may comprise the steps of: (a) authenticating, by a digital asset token issuer computer system associated with a digital asset token issuer, an access request by a first user device associated with a first user, to the digital asset token issuer computer system, comprising the steps of: (1) receiving, by the digital asset token issuer computer system from the first user device, an authentication request including first user credential information associated with the first user; (2) determining, by the digital asset token issuer computer system, that the first user device is authorized to access the digital asset token issuer computer system based at least in part on the first user credential information; (3) generating, by the digital asset token issuer computer system, first graphical user interface information for displaying a first graphical user interface on the first user device; (4) transmitting, from the digital asset token issuer computer system to the first user device, the first graphical user interface information; (b) obtaining, by the digital asset computer system from the first user device, a withdraw request, comprising the steps of: (1) receiving, by the digital asset token issuer computer system from the first user device, a first electronic request to withdraw stable value digital asset tokens, wherein the stable value digital asset token is maintained on a distributed public transaction ledger in the form of a blockchain associated with an underlying digital asset that is maintained by a blockchain network including a plurality of geographically distributed computer systems in a peer-to-peer network, and each stable value digital asset token is issued based on first smart contract instructions provided at a first contract address on the blockchain; (2) in response to the first electronic request, obtaining, by the digital asset token issuer computer system from a currency account ledger database stored on computer readable member accessible by the digital asset token issuer computer system, first account balance information of the first user indicating a first amount of available currency for the first user held by the digital asset token issuer on behalf of the first user; (3) generating, by the digital asset token issuer computer system, second graphical user interface information including at least the first account balance information; (4) transmitting, by the digital asset token issuer computer system to the first user device, the second graphical user interface information; and (5) receiving, by the digital asset token issuer computer system from the first user device, a second electronic withdrawal request comprising at least: (A) a first amount of stable value digital asset tokens to be withdrawn; and (B) a destination address on the underlying blockchain to which the first amount of stable value digital asset tokens is provided; (c) processing, by the digital asset token issuer computer system, the withdraw request by the steps of: (1) calculating, by the digital asset token issuer computer system, a second amount of currency based on the first amount of stable value digital asset tokens, where the second amount of currency is determined using a fixed predetermined ratio of stable value digital asset tokens to currency; (2) determining, by the digital asset token issuer computer system, that the second amount of currency is less than the first amount of available currency of the first user; (3) in the case where the second amount of currency is less than the first amount of available currency of the first user, determining a third amount of currency associated with an updated amount of available currency of the first user, wherein the third amount of currency equals the first amount of available currency of the first user less the second amount of currency; (4) updating, by the digital asset token issuer computer system, the currency account ledger database to reflect that the updated amount of available currency of the first user is the third amount of currency; (5) updating, by the digital asset token issuer computer system, a stable value digital asset token issuer currency ledger, to increase a balance of currency by the second amount of currency; (6) generating, by the digital asset token issuer computer system, a first transaction request for the blockchain, from a first digital asset token issuer public key address on the blockchain, which is mathematically related to a first digital asset token issuer private key, which is stored in the computer readable member accessible by the digital asset token issuer computer system, to the first contract address associated with a stable value digital asset token issuer, and including a first message including: i. a request to generate and provide the first amount of stable value digital asset tokens to the destination public address of the first user; and ii. a digital signature generated using the digital asset token issuer private key, and (7) transmitting, by the digital asset token issuer computer system to the blockchain network via the Internet, the first transaction request, wherein, in response to the first message in the first transaction request, the blockchain network verifies the digital signature and executes the request to generate and provide the first amount of stable value tokens to the destination public address of the first user; and (8) confirming, by the digital asset token issuer computer system based on reference to the blockchain, that the first transaction request has been processed by the blockchain network so that the balance of stable value digital asset tokens in the destination public address of the first user includes the first amount of stable value digital asset tokens.

In embodiments, the determining in (a)(2) further determines that the first user is a registered user of the digital asset token issuer.

In embodiments, the digital asset token issuer is licensed by a government regulatory authority.

In embodiments, the underlying digital asset is ether and the blockchain is the Ethereum Blockchain.

In embodiments, the underlying digital asset is neo and the blockchain is the Neo Blockchain.

In embodiments, the currency is a fiat currency.

In embodiments, the fiat currency is U.S. dollar.

In embodiments, the fixed predetermined ratio is one stable value digital asset token is equal to one U.S. dollar.

In embodiments, the fixed predetermined ratio is one hundred stable value digital asset tokens is equal to one U.S. dollar.

In embodiments, the fiat currency is GB pound.

In embodiments, the fiat currency is SG dollar.

In embodiments, the fiat currency is EUR.

In embodiments, the fiat currency is HK dollar.

In embodiments, the fiat currency is Canadian dollar.

In embodiments, the fiat currency is Australian dollar.

In embodiments, the fiat currency is Yen.

In embodiments, the currency is a cryptocurrency.

In embodiments, the cryptocurrency is Bitcoin.

In embodiments, the cryptocurrency is Litecoin.

In embodiments, the cryptocurrency is Bitcoin Cash.

In embodiments, the cryptocurrency is Filecoin.

In embodiments, the cryptocurrency is Zcash.

In embodiments, the cryptocurrency is Stellar.

In embodiments, the cryptocurrency is Polkadot.

In embodiments, the cryptocurrency is Atom.

In embodiments, the cryptocurrency is Tezos.

In embodiments, the updating in (c)(5) further comprises transferring the second amount of currency from a digital asset token issuer currency account to a stable value digital asset token issuer currency account.

In embodiments, the updating in (c)(5) further comprises periodically transferring currency between the digital asset token issuer currency account and the stable value digital asset token issuer currency account.

In embodiments, the request to obtain in the destination public address of the first user the first amount of stable value digital asset tokens includes a request to generate the first amount of stable value digital asset tokens at the destination public address of the first user.

In embodiments, the request to obtain in the destination public address of the first user the first amount of stable value digital asset tokens includes a request to transfer the first amount of stable value digital asset tokens from a stable value digital asset token issuer public address to the destination public address of the first user.

In embodiments, a method of obtaining stable value digital asset tokens may comprise the steps of: (a) providing a first designated key pair comprising a first designated public key and a corresponding first designated private key, wherein the first designated private key also corresponds to a first designated public address associated with a first underlying digital asset; wherein the first underlying digital asset is maintained on a first distributed public transaction ledger maintained in the form of a first blockchain by a first plurality of geographically distributed computer systems in a first peer-to-peer network in the form of a first blockchain network, and wherein the first designated private key is stored on a first computer system which is connected via the Internet to the first blockchain network; (b) providing a second designated key pair comprising a second designated public key and a corresponding second designated private key, wherein the second designated private key also corresponds to a second designated public address associated with the underlying digital asset; and wherein the second designated private key is stored on a second computer system which is physically separated from the first computer system and is not operatively or physically connected to the first blockchain network; (c) receiving, by an administrator system, a request to obtain a first sum of stable value digital asset tokens in exchange for a second sum of second digital asset, wherein the second digital asset is maintained on a second distributed public transaction ledger in the form of a second blockchain associated with a second underlying digital asset that is maintained by a second blockchain network including a second plurality of geographically distributed computer systems in a second peer-to-peer network, wherein the first sum corresponds to the second sum based on a fixed ratio of stable value digital asset token to second digital asset, wherein the request comes from a first requesting user with an associated first requester key pair, comprising a first requester public key and a corresponding first requester private key, and wherein the first requester private key also corresponds to a first requester public address associated with the underlying digital asset; (d) confirming, by the administrator system, receipt of the second sum of second digital asset; (e) transferring the first sum of stable value digital asset tokens to the first requester public address using the following steps: (1) sending a second request, from the administrator system to the first computer system, to obtain the first sum of stable value digital asset tokens and transfer said first sum to the first requester public address; (2) generating, by the first computer system, first instructions addressed from the first designated public address to a first contract address including a message to obtain the first sum of stable value digital asset tokens and to assign the obtained first sum to the first requester public address, wherein the first contract address is associated with the underlying digital asset, wherein the first contract address is associated with first smart contract instructions for a stable value digital asset token, and wherein the first smart contract instructions are saved as part of the first blockchain for the underlying digital asset and include: (A) token creation instructions including instructions to create tokens; (B) token transfer instructions including instructions to transfer tokens; (C) token destruction instructions including instructions to destroy tokens; (D) authorization instructions associated with the first designated key pair; and (E) authorization instructions associated with the second designated key pair; (3) digitally signing, by the first computer system, the first instructions using the first designated private key to generate first digitally signed instructions; (4) sending, from the first computer system to the plurality of geographically distributed computer systems, the first digitally signed instructions; wherein the first digitally signed instructions are executed by the plurality of geographically distributed computer systems in accordance with the first contract instructions; and (f) confirming, by the administrator system, that the first sum of stable value digital asset tokens has been obtained and transferred to the first requester public address based on reference to the first blockchain.

In embodiments, the method may further comprise the steps of: (g) receiving, by the administrator system, a third request to obtain a third sum of stable value digital asset tokens in exchange for a fourth sum of second digital asset, wherein the third sum corresponds to the fourth sum based on the fixed ratio of stable value digital asset token to second digital asset, wherein the third request comes from a second requesting user with an associated second requester key pair, comprising a second requester public key and a corresponding second requester private key, and wherein the second requester private key is associated with a second requester public address associated with the underlying digital asset; (h) confirming, by the administrator system, receipt of the fourth sum of second digital asset; (i) transferring the third sum of stable value digital asset tokens to the second requester public address using the following steps: (1) generating, by the administrator system, second instructions from the second designated public address to the first contract address to obtain the third sum of stable value digital asset tokens and transfer said third sum to the second requester public address; (2) transferring, from the administrator system to a first portable memory device, the second instructions; (3) transferring, from the first portable memory device to the second computer, the second instructions; (4) digitally signing, by the second computer, the second instructions using the second designated private key to generate second digitally signed instructions; (5) transferring, from the second computer to a second portable memory device, the second digitally signed instructions; and (6) sending, from the second portable memory device to the plurality of geographically distributed computer systems, the second digitally signed instructions; and (j) confirming, by the administrator system, that the third sum of stable value digital asset tokens have been obtained and transferred to the second requester public address based on reference to the first blockchain.

In embodiments, the step of (i)(6) includes: (A) transferring, from the second portable memory device to the administrator system, the second digitally signed instructions; and (B) transferring, from the administrator system to the plurality of geographically distributed computer systems, the second digitally signed instructions.

In embodiments, the method may further comprise the steps of: (k) providing a third designated key pair comprising a third designated public key and a corresponding third designated private key, wherein the third designated private key is stored on a third computer system which is physically separated from the first computer system and the second computer system and wherein the third computer system is not operatively connected or physically connected to the first blockchain network; wherein the first smart contract instructions include: (F) authorization instructions associated with the third designated key pair; and wherein with respect to step (i), performing the following further steps: (7) determining that the first designated key pair does not have authority to obtain the third sum of stable value digital asset tokens; (8) determining, by the administrator system, the third designated key pair and the second designated key pair together have authority to obtain the third sum, and performing the following steps: (9) generating, by the administrator system, third instructions from the third designated public address to the first contract address to obtain the third sum of stable value digital asset tokens and transfer said third sum to the second requester public address; (10) transferring, from the administrator system to a third portable memory device, the third instructions; (11) transferring, from the third portable memory device to the third computer system, the third instructions; (12) digitally signing, by the third computer system, the third instructions using the third designated private key to generate third digitally signed instructions; (13) transferring, from the third computer system to a fourth portable memory device, the third digitally signed instructions; and (14) sending, from the fourth portable memory device to the plurality of geographically distributed computer systems, the third digitally signed instructions.

In embodiments, the step (i)(14) includes the steps of: (A) transferring, from the fourth portable memory device to the administrator system, the third digitally signed instructions; and (B) transferring, from the administrator system to the plurality of geographically distributed computer systems, the third digitally signed instructions.

In embodiments, the third portable memory device and fourth portable memory device are the same portable memory device.

In embodiments, the third portable memory device and fourth portable memory device are different portable memory devices.

In embodiments, the method may further include the steps of: (k) providing a third designated key pair comprising a third designated public key and a corresponding third designated private key, wherein the third designated private key is stored on a third computer system which is physically separated from the first computer system and the second computer system and wherein the third computer system is not operatively connected or physically connected to the first blockchain network; and wherein the first smart contract instructions further include: (F) authorization instructions associated with the third key pair; and wherein with respect to step (i), performing the following further steps: (7) determining the first designated key pair does not have authority to obtain the third sum; (8) determining the first designated key pair does not have authority to obtain the third sum; (9) determining, by the administrator system, that the third designated key pair, the second designated key pair and the first designated key pair together have authority to obtain the third sum; (10) sending a fifth request, from the administrator system to the first computer system, to obtain the third sum of stable value digital asset tokens and transfer said third sum to the second requester public address; (11) generating, by the administrator system, third instructions from the third designated public address to the first contract address to obtain the third sum of stable value digital asset tokens and transfer said third sum to the second requester public address; (12) transferring, from the administrator system to a third portable memory device, the third instructions; (13) transferring, from the third portable memory device to the third computer system, the third instructions; (14) digitally signing, by the third computer system, the third instructions using the third designated private key to generate third digitally signed instructions; (15) transferring, from the third computer system to a fourth portable memory device, the third digitally signed instructions; and (16) sending, from the fourth portable memory device to the plurality of geographically distributed computer systems, the third digitally signed instructions.

In embodiments, the step (i)(16) includes: (A) transferring, from the fourth portable memory device to the administrator system, the third digitally signed instructions; and (B) transferring, from the administrator system to the plurality of geographically distributed computer systems, the third digitally signed instructions.

In embodiments, the method further includes the steps of: (k) providing, by the administrator system a ledger including first account information associated with at least the first requesting user and second account information associated with at least the second requesting user, wherein the first account information includes first stable value digital asset token balance information and the second account information includes second stable value digital asset token balance information; (l) determining, by the administrator system, a total balance of the stable value digital asset tokens based on the sum of the first stable value digital asset token balance information and the second stable value digital asset token balance information; and (m) publishing, by the administrator system, the total balance of stable value digital asset tokens.

In embodiments, the method further includes the steps of: (k) generating, by a first requester computing device associated with the first requester, a transfer message to transfer stable value digital asset tokens to the second requester public address, the transfer message including: (1) a transfer number of stable value digital asset tokens; (2) the first requester public address; (3) the second requester public address; and (4) an electronic signature based on the first requester private key; (l) publishing, by the first requester computing device to the to the plurality of geographically distributed computer systems, the transfer message; and (m) confirming, by the first requester computing device, transfer of the number of stable value digital asset tokens from the first requester public address to the second requester public address by reference to the first blockchain.

In embodiments, the first portable memory device and second portable memory device are the same portable memory device.

In embodiments, the first portable memory device and second portable memory device are different portable memory devices.

In embodiments, the fourth sum of second digital asset is deposited in one or more bank accounts associated with the administrator.

In embodiments, the fourth sum of second digital asset is used by the administrator to purchase one or more interest bearing financial instruments.

In embodiments, the authorization instructions associated with the first designated key pair include a limit on a number of tokens the first designated key pair is authorized to issue.

In embodiments, the authorization instructions associated with the first designated key pair include a time limit during which the first designated key pair is authorized to issue tokens.

In embodiments, the authorization instructions associated with the first designated key pair include a limit on a number of tokens the first designated key pair is authorized to issue over a period of time.

In embodiments, the fixed predetermined ratio is one stable value digital asset token is equal to one second digital asset.

In embodiments, the second digital asset is Bitcoin.

In embodiments, the second digital asset is Litecoin.

In embodiments, the second digital asset is Bitcoin Cash.

In embodiments, the second digital asset is Filecoin.

In embodiments, the second digital asset is Zcash.

In embodiments, the second digital asset is Stellar.

In embodiments, the second digital asset is Polkadot.

In embodiments, the second digital asset is Atom.

In embodiments, the second digital asset is Tezos.

In embodiments, the first designated public key is mathematically associated with the first designated private key.

In embodiments, the second designated public key is mathematically associated with the second designated private key.

In embodiments, the first contract instructions are based on the ERC720 standard.

In embodiments, the first blockchain is the Ethereum blockchain.

In embodiments, the first blockchain is the NEO blockchain.

In embodiments, the second sum of second digital asset is deposited in one or more bank accounts associated with the administrator.

In embodiments, the second sum of second digital asset is used by the administrator to purchase one or more interest bearing financial instruments.

In embodiments, the first request to obtain the first sum of stable value digital asset tokens specifies a requester fee payable to the administrator system in addition to the second sum of second digital asset and step (d) includes confirming, by the administrator system, receipt of the second sum of second digital asset and the requester fee.

In embodiments, the first request to obtain the first sum of stable value digital asset tokens specifies a miner fee payable to miners associated with the plurality of geographically distributed computer systems and step (d) includes confirming, by the administrator system, receipt of the second sum of second digital asset and the miner fee.

In embodiments, a method of obtaining stable value digital asset tokens may comprise the steps of: (a) providing a first designated key pair comprising a first designated public key and a corresponding first designated private key, wherein the first designated private key also corresponds to a first designated public address associated with an underlying digital asset; wherein the underlying digital asset is maintained on a first distributed public transaction ledger maintained in the form of a first blockchain by a first plurality of geographically distributed computer systems in a first peer-to-peer network in the form of a first blockchain network, and wherein the first designated private key is stored on a first computer system which is connected via the Internet to the first blockchain network; (b) providing a second designated key pair comprising a second designated public key and a corresponding second designated private key, wherein the second designated private key also corresponds to a second designated public address associated with the first underlying digital asset; and wherein the second designated private key is stored on a second computer system which is physically separated from the first computer system and is not operatively or physically connected to the first blockchain network; (c) receiving, by a digital asset exchange system, a request to obtain a first sum of stable value digital asset tokens in exchange for a second sum of second digital asset, wherein the second digital asset is maintained on a second distributed public transaction ledger in the form of a second blockchain associated with a second underlying digital asset that is maintained by a second blockchain network including a second plurality of geographically distributed computer systems in a second peer-to-peer network, wherein the first sum corresponds to the second sum based on a fixed ratio of stable value digital asset token to second digital asset, and wherein the request comes from a first requesting user with an associated first requester key pair, comprising a first requester public key and a corresponding first requester private key, wherein the first requester private key also corresponds to a first requester public address associated with the underlying digital asset; (d) confirming, by the digital asset exchange system, receipt of the second sum of second digital asset; (e) transferring the first sum of stable value digital asset tokens to the first requester public address using the following steps: (1) sending a second request, from the digital asset exchange system to the first computer system, to obtain the first sum of stable value digital asset tokens and transfer said first sum to the first requester public address; (2) generating, by the first computer system, first instructions addressed from the first designated public address to a first contract address including a message to obtain the first sum of stable value digital asset tokens and to assign the obtained first sum to the first requester public address, wherein the first contract address is associated with the underlying digital asset, wherein the first contract address is associated with first smart contract instructions for a stable value digital asset token, and wherein the first smart contract instructions are saved as part of the first blockchain for the underlying digital asset and include: (A) token creation instructions including instructions to create tokens; (B) token transfer instructions including instructions to transfer tokens; (C) token destruction instructions including instructions to destroy tokens; (D) authorization instructions associated with the first designated key pair; and (E) authorization instructions associated with the second designated key pair; (3) digitally signing, by the first computer system, the first instructions using the first designated private key to generate first digitally signed instructions; (4) sending, from the first computer system to the plurality of geographically distributed computer systems, the first digitally signed instructions; wherein the first digitally signed instructions are executed by the plurality of geographically distributed computer systems in accordance with the first contract instructions; and (f) confirming, by the digital asset exchange system, that the first sum of stable value digital asset tokens has been obtained and transferred to the first requester public address based on reference to the first blockchain.

In embodiments, the method may further comprise the steps of: (g) receiving, by the digital asset exchange system, a third request to obtain a third sum of stable value digital asset tokens in exchange for a fourth sum of second digital asset, wherein the third sum corresponds to the fourth sum based on the fixed ratio of stable value digital asset token to second digital asset, wherein the third request comes from a second requesting user with an associated second requester key pair, comprising a second requester public key and a corresponding second requester private key, and wherein the second requester private key is associated with a second requester public address associated with the underlying digital asset; (h) confirming, by the digital asset exchange system, receipt of the fourth sum of second digital asset; (i) transferring the third sum of stable value digital asset tokens to the second requester public address using the following steps: (1) generating, by the digital asset exchange system, second instructions from the second designated public address to the first contract address to obtain the third sum of stable value digital asset tokens and transfer said third sum to the second requester public address; (2) transferring, from the digital asset exchange system to a first portable memory device, the second instructions; (3) transferring, from the first portable memory device to the second computer, the second instructions; (4) digitally signing, by the second computer, the second instructions using the second designated private key to generate second digitally signed instructions; (5) transferring, from the second computer to a second portable memory device, the second digitally signed instructions; and (6) sending, from the second portable memory device to the plurality of geographically distributed computer systems, the second digitally signed instructions; and (j) confirming, by the digital asset exchange system, that the third sum of stable value digital asset tokens have been obtained and transferred to the second requester public address based on reference to the first blockchain.

In embodiments, the step of (i)(6) includes: (A) transferring, from the second portable memory device to the digital asset exchange system, the second digitally signed instructions; and (B) transferring, from the digital asset exchange system to the plurality of geographically distributed computer systems, the second digitally signed instructions.

In embodiments, the method further comprises the steps of: (k) providing a third designated key pair comprising a third designated public key and a corresponding third designated private key, wherein the third designated private key is stored on a third computer system which is physically separated from the first computer system and the second computer system and wherein the third computer system is not operatively connected or physically connected to the first blockchain network; wherein the first smart contract instructions include: (F) authorization instructions associated with the third designated key pair; and wherein with respect to step (i), performing the following further steps: (7) determining that the first designated key pair does not have authority to obtain the third sum of stable value digital asset tokens; (8) determining, by the digital asset exchange system, the third designated key pair and the second designated key pair together have authority to obtain the third sum, and performing the following steps: (9) generating, by the digital asset exchange system, third instructions from the third designated public address to the first contract address to obtain the third sum of stable value digital asset tokens and transfer said third sum to the second requester public address; (10) transferring, from the digital asset exchange system to a third portable memory device, the third instructions; (11) transferring, from the third portable memory device to the third computer system, the third instructions; (12) digitally signing, by the third computer system, the third instructions using the third designated private key to generate third digitally signed instructions; (13) transferring, from the third computer system to a fourth portable memory device, the third digitally signed instructions; and (14) sending, from the fourth portable memory device to the plurality of geographically distributed computer systems, the third digitally signed instructions.

In embodiments, step (i)(14) includes the steps of: (A) transferring, from the fourth portable memory device to the digital asset exchange system, the third digitally signed instructions; and (B) transferring, from the digital asset exchange system to the plurality of geographically distributed computer systems, the third digitally signed instructions.

In embodiments, the third portable memory device and fourth portable memory device are the same portable memory device.

In embodiments, the third portable memory device and fourth portable memory device are different portable memory devices.

In embodiments, the method further includes the steps of: (k) providing a third designated key pair comprising a third designated public key and a corresponding third designated private key, wherein the third designated private key is stored on a third computer system which is physically separated from the first computer system and the second computer system and wherein the third computer system is not operatively connected or physically connected to the first blockchain network; and wherein the first smart contract instructions further include: (F) authorization instructions associated with the third key pair; and wherein with respect to step (i), performing the following further steps: (7) determining the first designated key pair does not have authority to obtain the third sum; (8) determining the first designated key pair does not have authority to obtain the third sum; (9) determining, by the digital asset exchange system, that the third designated key pair, the second designated key pair and the first designated key pair together have authority to obtain the third sum; (10) sending a fifth request, from the digital asset exchange system to the first computer system, to obtain the third sum of stable value digital asset tokens and transfer said third sum to the second requester public address; (11) generating, by the digital asset exchange system, third instructions from the third designated public address to the first contract address to obtain the third sum of stable value digital asset tokens and transfer said third sum to the second requester public address; (12) transferring, from the digital asset exchange system to a third portable memory device, the third instructions; (13) transferring, from the third portable memory device to the third computer system, the third instructions; (14) digitally signing, by the third computer system, the third instructions using the third designated private key to generate third digitally signed instructions; (15) transferring, from the third computer system to a fourth portable memory device, the third digitally signed instructions; and (16) sending, from the fourth portable memory device to the plurality of geographically distributed computer systems, the third digitally signed instructions.

In embodiments, the step (i)(16) includes: (A) transferring, from the fourth portable memory device to the digital asset exchange system, the third digitally signed instructions; and (B) transferring, from the digital asset exchange system to the plurality of geographically distributed computer systems, the third digitally signed instructions.

In embodiments, the method further includes the steps of: (k) providing, by the digital asset exchange system a ledger including first account information associated with at least the first requesting user and second account information associated with at least the second requesting user, wherein the first account information includes first stable value digital asset token balance information and the second account information includes second stable value digital asset token balance information; (l) determining, by the digital asset exchange system, a total balance of the stable value digital asset tokens based on the sum of the first stable value digital asset token balance information and the second stable value digital asset token balance information; and (m) publishing, by the digital asset exchange system, the total balance of stable value digital asset tokens.

In embodiments, the method further includes the steps of: (k) generating, by a first requester computing device associated with the first requester, a transfer message to transfer stable value digital asset tokens to the second requester public address, the transfer message including: (1) a transfer number of stable value digital asset tokens; (2) the first requester public address; (3) the second requester public address; and (4) an electronic signature based on the first requester private key; (l) publishing, by the first requester computing device to the to the plurality of geographically distributed computer systems, the transfer message; and (m) confirming, by the first requester computing device, transfer of the number of stable value digital asset tokens from the first requester public address to the second requester public address by reference to the first blockchain.

In embodiments, the first portable memory device and second portable memory device are the same portable memory device.

In embodiments, the first portable memory device and second portable memory device are different portable memory devices.

In embodiments, the fourth sum of second digital asset is deposited in one or more bank accounts associated with the digital asset exchange.

In embodiments, the fourth sum of second digital asset is used by the digital asset exchange to purchase one or more interest bearing financial instruments.

In embodiments, the authorization instructions associated with the first designated key pair include a limit on a number of tokens the first designated key pair is authorized to issue.

In embodiments, the authorization instructions associated with the first designated key pair include a time limit during which the first designated key pair is authorized to issue tokens.

In embodiments, the authorization instructions associated with the first designated key pair include a limit on a number of tokens the first designated key pair is authorized to issue over a period of time.

In embodiments, the fixed predetermined ratio is one stable value digital asset token is equal to one second digital asset.

In embodiments, the second digital asset is Bitcoin.

In embodiments, the second digital asset is Litecoin.

In embodiments, the second digital asset is Bitcoin Cash.

In embodiments, the second digital asset is Filecoin.

In embodiments, the second digital asset is Zcash.

In embodiments, the second digital asset is Stellar.

In embodiments, the second digital asset is Polkadot.

In embodiments, the second digital asset is Atom.

In embodiments, the second digital asset is Tezos.

In embodiments, the first designated public key is mathematically associated with the first designated private key.

In embodiments, the second designated public key is mathematically associated with the second designated private key.

In embodiments, the first contract instructions are based on the ERC720 standard.

In embodiments, the first blockchain is the Ethereum blockchain.

In embodiments, the first blockchain is the NEO blockchain.

In embodiments, the second sum of second digital asset is deposited in one or more bank accounts associated with the digital asset exchange.

In embodiments, the first request to obtain the first sum of stable value digital asset tokens specifies a requester fee payable to the digital asset exchange system in addition to the second sum of second digital asset and step (d) includes confirming, by the digital asset exchange system, receipt of the second sum of second digital asset and the requester fee.

In embodiments, the first request to obtain the first sum of stable value digital asset tokens specifies a miner fee payable to miners associated with the plurality of geographically distributed computer systems and step (d) includes confirming, by the digital asset exchange system, receipt of the second sum of second digital asset and the miner fee.

In embodiments, a method of obtaining stable value digital asset tokens may comprise the steps of: (a) providing a first designated key pair comprising a first designated public key and a corresponding first designated private key, wherein the first designated private key also corresponds to a first designated public address associated with an underlying digital asset; wherein the underlying digital asset is maintained on a first distributed public transaction ledger maintained in the form of a first blockchain by a plurality of geographically distributed computer systems in a first peer-to-peer network in the form of a first blockchain network, and wherein the first designated private key is stored on a first computer system which is connected via the Internet to the first blockchain network; (b) providing a second designated key pair comprising a second designated public key and a corresponding second designated private key, wherein the second designated private key also corresponds to a second designated public address associated with the underlying digital asset; and wherein the second designated private key is stored on a second computer system which is physically separated from the first computer system and is not operatively or physically connected to the first blockchain network; (c) receiving, by a digital asset token issuer system, a request to obtain a first sum of stable value digital asset tokens in exchange for a second sum of second digital asset, wherein the second digital asset is maintained on a second distributed public transaction ledger in the form of a second blockchain associated with a second underlying digital asset that is maintained by a second blockchain network including a second plurality of geographically distributed computer systems in a second peer-to-peer network, wherein the first sum corresponds to the second sum based on a fixed ratio of stable value digital asset token to second digital asset, wherein the request comes from a first requesting user with an associated first requester key pair, comprising a first requester public key and a corresponding first requester private key, and wherein the first requester private key also corresponds to a first requester public address associated with the underlying digital asset; (d) confirming, by the digital asset token issuer system, receipt of the second sum of second digital asset; (e) transferring the first sum of stable value digital asset tokens to the first requester public address using the following steps: (1) sending a second request, from the digital asset token issuer system to the first computer system, to obtain the first sum of stable value digital asset tokens and transfer said first sum to the first requester public address; (2) generating, by the first computer system, first instructions addressed from the first designated public address to a first contract address including a message to obtain the first sum of stable value digital asset tokens and to assign the obtained first sum to the first requester public address, wherein the first contract address is associated with the underlying digital asset, wherein the first contract address is associated with first smart contract instructions for a stable value digital asset token, and wherein the first smart contract instructions are saved as part of the first blockchain for the underlying digital asset and include: (A) token creation instructions including instructions to create tokens; (B) token transfer instructions including instructions to transfer tokens; (C) token destruction instructions including instructions to destroy tokens; (D) authorization instructions associated with the first designated key pair; and (E) authorization instructions associated with the second designated key pair; (3) digitally signing, by the first computer system, the first instructions using the first designated private key to generate first digitally signed instructions; (4) sending, from the first computer system to the plurality of geographically distributed computer systems, the first digitally signed instructions; wherein the first digitally signed instructions are executed by the plurality of geographically distributed computer systems in accordance with the first contract instructions; and (f) confirming, by the digital asset token issuer system, that the first sum of stable value digital asset tokens has been obtained and transferred to the first requester public address based on reference to the first blockchain.

In embodiments, the method further comprises the steps of: (g) receiving, by the digital asset token issuer system, a third request to obtain a third sum of stable value digital asset tokens in exchange for a fourth sum of second digital asset, wherein the third sum corresponds to the fourth sum based on the fixed ratio of stable value digital asset token to second digital asset, wherein the third request comes from a second requesting user with an associated second requester key pair, comprising a second requester public key and a corresponding second requester private key, and wherein the second requester private key is associated with a second requester public address associated with the underlying digital asset; (h) confirming, by the digital asset token issuer system, receipt of the fourth sum of second digital asset; (i) transferring the third sum of stable value digital asset tokens to the second requester public address using the following steps: (1) generating, by the digital asset token issuer system, second instructions from the second designated public address to the first contract address to obtain the third sum of stable value digital asset tokens and transfer said third sum to the second requester public address; (2) transferring, from the digital asset token issuer system to a first portable memory device, the second instructions; (3) transferring, from the first portable memory device to the second computer, the second instructions; (4) digitally signing, by the second computer, the second instructions using the second designated private key to generate second digitally signed instructions; (5) transferring, from the second computer to a second portable memory device, the second digitally signed instructions; and (6) sending, from the second portable memory device to the plurality of geographically distributed computer systems, the second digitally signed instructions; and (j) confirming, by the digital asset token issuer system, that the third sum of stable value digital asset tokens have been obtained and transferred to the second requester public address based on reference to the first blockchain.

In embodiments, the step of (i)(6) includes: (A) transferring, from the second portable memory device to the digital asset token issuer system, the second digitally signed instructions; and (B) transferring, from the digital asset token issuer system to the plurality of geographically distributed computer systems, the second digitally signed instructions.

In embodiments, the method further comprises the steps of: (k) providing a third designated key pair comprising a third designated public key and a corresponding third designated private key, wherein the third designated private key is stored on a third computer system which is physically separated from the first computer system and the second computer system and wherein the third computer system is not operatively connected or physically connected to the first blockchain network; wherein the first smart contract instructions include: (F) authorization instructions associated with the third designated key pair; and wherein with respect to step (i), performing the following further steps: (7) determining that the first designated key pair does not have authority to obtain the third sum of stable value digital asset tokens; (8) determining, by the digital asset token issuer system, the third designated key pair and the second designated key pair together have authority to obtain the third sum, and performing the following steps: (9) generating, by the digital asset token issuer system, third instructions from the third designated public address to the first contract address to obtain the third sum of stable value digital asset tokens and transfer said third sum to the second requester public address; (10) transferring, from the digital asset token issuer system to a third portable memory device, the third instructions; (11) transferring, from the third portable memory device to the third computer system, the third instructions; (12) digitally signing, by the third computer system, the third instructions using the third designated private key to generate third digitally signed instructions; (13) transferring, from the third computer system to a fourth portable memory device, the third digitally signed instructions; and (14) sending, from the fourth portable memory device to the plurality of geographically distributed computer systems, the third digitally signed instructions.

In embodiments, step (i)(14) includes the steps of: (A) transferring, from the fourth portable memory device to the digital asset token issuer system, the third digitally signed instructions; and (B) transferring, from the digital asset token issuer system to the plurality of geographically distributed computer systems, the third digitally signed instructions.

In embodiments, the third portable memory device and fourth portable memory device are the same portable memory device.

In embodiments, the third portable memory device and fourth portable memory device are different portable memory devices.

In embodiments, the method further includes the steps of: (k) providing a third designated key pair comprising a third designated public key and a corresponding third designated private key, wherein the third designated private key is stored on a third computer system which is physically separated from the first computer system and the second computer system and wherein the third computer system is not operatively connected or physically connected to the first blockchain network; and wherein the first smart contract instructions further include: (F) authorization instructions associated with the third key pair; and wherein with respect to step (i), performing the following further steps: (7) determining the first designated key pair does not have authority to obtain the third sum; (8) determining the first designated key pair does not have authority to obtain the third sum; (9) determining, by the digital asset token issuer system, that the third designated key pair, the second designated key pair and the first designated key pair together have authority to obtain the third sum; (10) sending a fifth request, from the digital asset token issuer system to the first computer system, to obtain the third sum of stable value digital asset tokens and transfer said third sum to the second requester public address; (11) generating, by the digital asset token issuer system, third instructions from the third designated public address to the first contract address to obtain the third sum of stable value digital asset tokens and transfer said third sum to the second requester public address; (12) transferring, from the digital asset token issuer system to a third portable memory device, the third instructions; (13) transferring, from the third portable memory device to the third computer system, the third instructions; (14) digitally signing, by the third computer system, the third instructions using the third designated private key to generate third digitally signed instructions; (15) transferring, from the third computer system to a fourth portable memory device, the third digitally signed instructions; and (16) sending, from the fourth portable memory device to the plurality of geographically distributed computer systems, the third digitally signed instructions.

In embodiments, the step (i)(16) includes: (A) transferring, from the fourth portable memory device to the digital asset token issuer system, the third digitally signed instructions; and (B) transferring, from the digital asset token issuer system to the plurality of geographically distributed computer systems, the third digitally signed instructions.

In embodiments, the method further includes the steps of: (k) providing, by the digital asset token issuer system a ledger including first account information associated with at least the first requesting user and second account information associated with at least the second requesting user, wherein the first account information includes first stable value digital asset token balance information and the second account information includes second stable value digital asset token balance information; (l) determining, by the digital asset token issuer system, a total balance of the stable value digital asset tokens based on the sum of the first stable value digital asset token balance information and the second stable value digital asset token balance information; and (m) publishing, by the digital asset token issuer system, the total balance of stable value digital asset tokens.

In embodiments, the method further includes the steps of: (k) generating, by a first requester computing device associated with the first requester, a transfer message to transfer stable value digital asset tokens to the second requester public address, the transfer message including: (1) a transfer number of stable value digital asset tokens; (2) the first requester public address; (3) the second requester public address; and (4) an electronic signature based on the first requester private key; (l) publishing, by the first requester computing device to the to the plurality of geographically distributed computer systems, the transfer message; and (m) confirming, by the first requester computing device, transfer of the number of stable value digital asset tokens from the first requester public address to the second requester public address by reference to the first blockchain.

In embodiments, the first portable memory device and second portable memory device are the same portable memory device.

In embodiments, the first portable memory device and second portable memory device are different portable memory devices.

In embodiments, the fourth sum of second digital asset is deposited in one or more bank accounts associated with the digital asset token issuer.

In embodiments, the fourth sum of second digital asset is used by the digital asset token issuer to purchase one or more interest bearing financial instruments.

In embodiments, the authorization instructions associated with the first designated key pair include a limit on a number of tokens the first designated key pair is authorized to issue.

In embodiments, the authorization instructions associated with the first designated key pair include a time limit during which the first designated key pair is authorized to issue tokens.

In embodiments, the authorization instructions associated with the first designated key pair include a limit on a number of tokens the first designated key pair is authorized to issue over a period of time.

In embodiments, the fixed predetermined ratio is one stable value digital asset token is equal to one second digital asset.

In embodiments, the second digital asset is Bitcoin.

In embodiments, the second digital asset is Litecoin.

In embodiments, the second digital asset is Bitcoin Cash.

In embodiments, the second digital asset is Filecoin.

In embodiments, the second digital asset is Zcash.

In embodiments, wherein the second digital asset is Stellar.

In embodiments, the second digital asset is Polkadot.

In embodiments, the second digital asset is Atom.

In embodiments, the second digital asset is Tezos.

In embodiments, the first designated public key is mathematically associated with the first designated private key.

In embodiments, the second designated public key is mathematically associated with the second designated private key.

In embodiments, the first contract instructions are based on the ERC720 standard.

In embodiments, the first blockchain is the Ethereum blockchain.

In embodiments, the first blockchain is the NEO blockchain.

In embodiments, the second sum of second digital asset is deposited in one or more bank accounts associated with the digital asset token issuer.

In embodiments, the second sum of second digital asset is used by the digital asset token issuer to purchase one or more interest bearing financial instruments.

In embodiments, the first request to obtain the first sum of stable value digital asset tokens specifies a requester fee payable to the digital asset token issuer system in addition to the second sum of second digital asset and step (d) includes confirming, by the digital asset token issuer system, receipt of the second sum of second digital asset and the requester fee.

In embodiments, the first request to obtain the first sum of stable value digital asset tokens specifies a miner fee payable to miners associated with the plurality of geographically distributed computer systems and step (d) includes confirming, by the digital asset token issuer system, receipt of the second sum of second digital asset and the miner fee.

In embodiments, a method of obtaining stable value digital asset tokens may comprise the steps of: (a) providing a first designated key pair comprising a first designated public key and a corresponding first designated private key, wherein the first designated private key also corresponds to a first designated public address associated with an underlying digital asset; wherein the underlying digital asset is maintained on a distributed public transaction ledger maintained in the form of a blockchain by a plurality of geographically distributed computer systems in a peer-to-peer network in the form of a blockchain network, and wherein the first designated private key is stored on a first computer system which is connected via the Internet to the blockchain network; (b) providing a second designated key pair comprising a second designated public key and a corresponding second designated private key, wherein the second designated private key also corresponds to a second designated public address associated with the underlying digital asset; and wherein the second designated private key is stored on a second computer system which is physically separated from the first computer system and is not operatively or physically connected to the blockchain network; (c) receiving, by an administrator system, a request to obtain a first sum of stable value digital asset tokens in exchange for a second sum of currency, wherein the first sum corresponds to the second sum based on a fixed ratio of stable value digital asset token to currency, and wherein the request comes from a first requesting user with an associated first requester key pair, comprising a first requester public key and a corresponding first requester private key, wherein the first requester private key also corresponds to a first requester public address associated with the underlying digital asset; (d) confirming, by the administrator system, receipt of the second sum of currency; (e) transferring the first sum of stable value digital asset tokens to the first requester public address using the following steps: (1) sending a second request, from the administrator system to the first computer system, to obtain the first sum of stable value digital asset tokens and transfer said first sum to the first requester public address; (2) generating, by the first computer system, first instructions addressed from the first designated public address to a first contract address including a message to obtain the first sum of stable value digital asset tokens and to assign the obtained first sum to the first requester public address, wherein the first contract address is associated with the underlying digital asset, wherein the first contract address is associated with first smart contract instructions for a stable value digital asset token, and wherein the first smart contract instructions are saved as part of the blockchain for the underlying digital asset and include: (A) token creation instructions including instructions to create tokens; (B) token transfer instructions including instructions to transfer tokens; (C) token destruction instructions including instructions to destroy tokens; (D) authorization instructions associated with the first designated key pair; and (E) authorization instructions associated with the second designated key pair; (3) digitally signing, by the first computer system, the first instructions using the first designated private key to generate first digitally signed instructions; (4) sending, from the first computer system to the plurality of geographically distributed computer systems, the first digitally signed instructions; wherein the first digitally signed instructions are executed by the plurality of geographically distributed computer systems in accordance with the first contract instructions; and (f) confirming, by the administrator system, that the first sum of stable value digital asset tokens has been obtained and transferred to the first requester public address based on reference to the blockchain.

In embodiments, the method further comprises the steps of: (g) receiving, by the administrator system, a third request to obtain a third sum of stable value digital asset tokens in exchange for a fourth sum of currency, wherein the third sum corresponds to the fourth sum based on the fixed ratio of stable value digital asset token to currency, wherein the third request comes from a second requesting user with an associated second requester key pair, comprising a second requester public key and a corresponding second requester private key, and wherein the second requester private key is associated with a second requester public address associated with the underlying digital asset; (h) confirming, by the administrator system, receipt of the fourth sum of currency; (i) transferring the third sum of stable value digital asset tokens to the second requester public address using the following steps: (1) generating, by the administrator system, second instructions from the second designated public address to the first contract address to obtain the third sum of stable value digital asset tokens and transfer said third sum to the second requester public address; (2) transferring, from the administrator system to a first portable memory device, the second instructions; (3) transferring, from the first portable memory device to the second computer, the second instructions; (4) digitally signing, by the second computer, the second instructions using the second designated private key to generate second digitally signed instructions; (5) transferring, from the second computer to a second portable memory device, the second digitally signed instructions; and (6) sending, from the second portable memory device to the plurality of geographically distributed computer systems, the second digitally signed instructions; and (j) confirming, by the administrator system, that the third sum of stable value digital asset tokens have been obtained and transferred to the second requester public address based on reference to the blockchain.

In embodiments, the step of (i)(6) includes: (A) transferring, from the second portable memory device to the administrator system, the second digitally signed instructions; and (B) transferring, from the administrator system to the plurality of geographically distributed computer systems, the second digitally signed instructions.

In embodiments, the method further comprises the steps of: (k) providing a third designated key pair comprising a third designated public key and a corresponding third designated private key, wherein the third designated private key is stored on a third computer system which is physically separated from the first computer system and the second computer system and wherein the third computer system is not operatively connected or physically connected to the blockchain network; wherein the first smart contract instructions include: (F) authorization instructions associated with the third designated key pair; and wherein with respect to step (i), performing the following further steps: (7) determining that the first designated key pair does not have authority to obtain the third sum of stable value digital asset tokens; (8) determining, by the administrator system, the third designated key pair and the second designated key pair together have authority to obtain the third sum, and performing the following steps; (9) generating, by the administrator system, third instructions from the third designated public address to the first contract address to obtain the third sum of stable value digital asset tokens and transfer said third sum to the second requester public address; (10) transferring, from the administrator system to a third portable memory device, the third instructions; (11) transferring, from the third portable memory device to the third computer system, the third instructions; (12) digitally signing, by the third computer system, the third instructions using the third designated private key to generate third digitally signed instructions; (13) transferring, from the third computer system to a fourth portable memory device, the third digitally signed instructions; and (14) sending, from the fourth portable memory device to the plurality of geographically distributed computer systems, the third digitally signed instructions.

In embodiments, step (i)(14) includes the steps of: (A) transferring, from the fourth portable memory device to the administrator system, the third digitally signed instructions; and (B) transferring, from the administrator system to the plurality of geographically distributed computer systems, the third digitally signed instructions.

In embodiments, the third portable memory device and fourth portable memory device are the same portable memory device.

In embodiments, the third portable memory device and fourth portable memory device are different portable memory devices.

In embodiments, the method further includes the steps of: (k) providing a third designated key pair comprising a third designated public key and a corresponding third designated private key, wherein the third designated private key is stored on a third computer system which is physically separated from the first computer system and the second computer system and wherein the third computer system is not operatively connected or physically connected to the blockchain network, and wherein the first smart contract instructions further include: (F) authorization instructions associated with the third key pair; and wherein with respect to step (i), performing the following further steps: (7) determining the first designated key pair does not have authority to obtain the third sum; (8) determining the first designated key pair does not have authority to obtain the third sum; (9) determining, by the administrator system, that the third designated key pair, the second designated key pair and the first designated key pair together have authority to obtain the third sum; (10) sending a fifth request, from the administrator system to the first computer system, to obtain the third sum of stable value digital asset tokens and transfer said third sum to the second requester public address; (11) generating, by the administrator system, third instructions from the third designated public address to the first contract address to obtain the third sum of stable value digital asset tokens and transfer said third sum to the second requester public address; (12) transferring, from the administrator system to a third portable memory device, the third instructions; (13) transferring, from the third portable memory device to the third computer system, the third instructions; (14) digitally signing, by the third computer system, the third instructions using the third designated private key to generate third digitally signed instructions; (15) transferring, from the third computer system to a fourth portable memory device, the third digitally signed instructions; and (16) sending, from the fourth portable memory device to the plurality of geographically distributed computer systems, the third digitally signed instructions.

In embodiments, the step (i)(16) includes: (A) transferring, from the fourth portable memory device to the administrator system, the third digitally signed instructions; and (B) transferring, from the administrator system to the plurality of geographically distributed computer systems, the third digitally signed instructions.

In embodiments, the method further includes the steps of: (k) providing, by the administrator system a ledger including first account information associated with at least the first requesting user and second account information associated with at least the second requesting user, wherein the first account information includes first stable value digital asset token balance information and the second account information includes second stable value digital asset token balance information; (l) determining, by the administrator system, a total balance of the stable value digital asset tokens based on the sum of the first stable value digital asset token balance information and the second stable value digital asset token balance information; and (m) publishing, by the administrator system, the total balance of stable value digital asset tokens.

In embodiments, the method further includes the steps of: (k) generating, by a first requester computing device associated with the first requester, a transfer message to transfer stable value digital asset tokens to the second requester public address, the transfer message including: (1) a transfer number of stable value digital asset tokens; (2) the first requester public address; (3) the second requester public address; and (4) an electronic signature based on the first requester private key; (l) publishing, by the first requester computing device to the to the plurality of geographically distributed computer systems, the transfer message; and (m) confirming, by the first requester computing device, transfer of the number of stable value digital asset tokens from the first requester public address to the second requester public address by reference to the blockchain.

In embodiments, the first portable memory device and second portable memory device are the same portable memory device.

In embodiments, the first portable memory device and second portable memory device are different portable memory devices.

In embodiments, the fourth sum of currency is deposited in one or more bank accounts associated with the administrator.

In embodiments, the fourth sum of currency is used by the administrator to purchase one or more interest bearing financial instruments.

In embodiments, the authorization instructions associated with the first designated key pair include a limit on a number of tokens the first designated key pair is authorized to issue.

In embodiments, the authorization instructions associated with the first designated key pair include a time limit during which the first designated key pair is authorized to issue tokens.

In embodiments, the authorization instructions associated with the first designated key pair include a limit on a number of tokens the first designated key pair is authorized to issue over a period of time.

In embodiments, the currency is a fiat currency.

In embodiments, the fiat currency is U.S. dollar.

In embodiments, the fixed predetermined ratio is one stable value digital asset token is equal to one U.S. dollar.

In embodiments, the fixed predetermined ratio is one hundred stable value digital asset tokens is equal to one U.S. dollar.

In embodiments, the fiat currency is GB pound.

In embodiments, the fiat currency is SG dollar.

In embodiments, the fiat currency is EUR.

In embodiments, the fiat currency is HK dollar.

In embodiments, the fiat currency is Canadian dollar.

In embodiments, the fiat currency is Australian dollar.

In embodiments, the fiat currency is Yen.

In embodiments, the currency is a cryptocurrency.

In embodiments, the cryptocurrency is Bitcoin.

In embodiments, the cryptocurrency is Litecoin.

In embodiments, the cryptocurrency is Bitcoin Cash.

In embodiments, the cryptocurrency is Filecoin.

In embodiments, the cryptocurrency is Zcash.

In embodiments, the cryptocurrency is Stellar.

In embodiments, the cryptocurrency is Polkadot.

In embodiments, the cryptocurrency is Atom.

In embodiments, the cryptocurrency is Tezos.

In embodiments, the first designated public key is mathematically associated with the first designated private key.

In embodiments, the second designated public key is mathematically associated with the second designated private key.

In embodiments, the first contract instructions are based on the ERC720 standard.

In embodiments, the blockchain is the Ethereum blockchain.

In embodiments, the blockchain is the NEO blockchain.

In embodiments, the second sum of currency is deposited in one or more bank accounts associated with the administrator.

In embodiments, the second sum of currency is used by the administrator to purchase one or more interest bearing financial instruments.

In embodiments, the first request to obtain the first sum of stable value digital asset tokens specifies a requester fee payable to the administrator system in addition to the second sum of currency and step (d) includes confirming, by the administrator system, receipt of the second sum of currency and the requester fee.

In embodiments, the first request to obtain the first sum of stable value digital asset tokens specifies a miner fee payable to miners associated with the plurality of geographically distributed computer systems and step (d) includes confirming, by the administrator system, receipt of the second sum of currency and the miner fee.

In embodiments, a method of obtaining stable value digital asset tokens may comprise the steps of: (a) providing a first designated key pair comprising a first designated public key and a corresponding first designated private key, wherein the first designated private key also corresponds to a first designated public address associated with an underlying digital asset; wherein the underlying digital asset is maintained on a distributed public transaction ledger maintained in the form of a blockchain by a plurality of geographically distributed computer systems in a peer-to-peer network in the form of a blockchain network, and wherein the first designated private key is stored on a first computer system which is connected via the Internet to the blockchain network; (b) providing a second designated key pair comprising a second designated public key and a corresponding second designated private key, wherein the second designated private key also corresponds to a second designated public address associated with the underlying digital asset; and wherein the second designated private key is stored on a second computer system which is physically separated from the first computer system and is not operatively or physically connected to the blockchain network; (c) receiving, by a digital asset exchange system, a request to obtain a first sum of stable value digital asset tokens in exchange for a second sum of currency, wherein the first sum corresponds to the second sum based on a fixed ratio of stable value digital asset token to currency, and wherein the request comes from a first requesting user with an associated first requester key pair, comprising a first requester public key and a corresponding first requester private key, wherein the first requester private key also corresponds to a first requester public address associated with the underlying digital asset; (d) confirming, by the digital asset exchange system, receipt of the second sum of currency; (e) transferring the first sum of stable value digital asset tokens to the first requester public address using the following steps: (1) sending a second request, from the digital asset exchange system to the first computer system, to obtain the first sum of stable value digital asset tokens and transfer said first sum to the first requester public address; (2) generating, by the first computer system, first instructions addressed from the first designated public address to a first contract address including a message to obtain the first sum of stable value digital asset tokens and to assign the obtained first sum to the first requester public address, wherein the first contract address is associated with the underlying digital asset, wherein the first contract address is associated with first smart contract instructions for a stable value digital asset token, and wherein the first smart contract instructions are saved as part of the blockchain for the underlying digital asset and include: (A) token creation instructions including instructions to create tokens; (B) token transfer instructions including instructions to transfer tokens; (C) token destruction instructions including instructions to destroy tokens; (D) authorization instructions associated with the first designated key pair; and (E) authorization instructions associated with the second designated key pair; (3) digitally signing, by the first computer system, the first instructions using the first designated private key to generate first digitally signed instructions; (4) sending, from the first computer system to the plurality of geographically distributed computer systems, the first digitally signed instructions; wherein the first digitally signed instructions are executed by the plurality of geographically distributed computer systems in accordance with the first contract instructions; and (f) confirming, by the digital asset exchange system, that the first sum of stable value digital asset tokens has been obtained and transferred to the first requester public address based on reference to the blockchain.

In embodiments, the method further comprises the steps of: (g) receiving, by the digital asset exchange system, a third request to obtain a third sum of stable value digital asset tokens in exchange for a fourth sum of currency, wherein the third sum corresponds to the fourth sum based on the fixed ratio of stable value digital asset token to currency, wherein the third request comes from a second requesting user with an associated second requester key pair, comprising a second requester public key and a corresponding second requester private key, and wherein the second requester private key is associated with a second requester public address associated with the underlying digital asset; (h) confirming, by the digital asset exchange system, receipt of the fourth sum of currency; (i) transferring the third sum of stable value digital asset tokens to the second requester public address using the following steps: (1) generating, by the digital asset exchange system, second instructions from the second designated public address to the first contract address to obtain the third sum of stable value digital asset tokens and transfer said third sum to the second requester public address; (2) transferring, from the digital asset exchange system to a first portable memory device, the second instructions; (3) transferring, from the first portable memory device to the second computer, the second instructions; (4) digitally signing, by the second computer, the second instructions using the second designated private key to generate second digitally signed instructions; (5) transferring, from the second computer to a second portable memory device, the second digitally signed instructions; and (6) sending, from the second portable memory device to the plurality of geographically distributed computer systems, the second digitally signed instructions; and (j) confirming, by the digital asset exchange system, that the third sum of stable value digital asset tokens have been obtained and transferred to the second requester public address based on reference to the blockchain.

In embodiments, the step of (i)(6) includes: (A) transferring, from the second portable memory device to the digital asset exchange system, the second digitally signed instructions; and (B) transferring, from the digital asset exchange system to the plurality of geographically distributed computer systems, the second digitally signed instructions.

In embodiments, the method further comprises the steps of: (k) providing a third designated key pair comprising a third designated public key and a corresponding third designated private key, wherein the third designated private key is stored on a third computer system which is physically separated from the first computer system and the second computer system and wherein the third computer system is not operatively connected or physically connected to the blockchain network; wherein the first smart contract instructions include: (F) authorization instructions associated with the third designated key pair; and wherein with respect to step (i), performing the following further steps: (7) determining that the first designated key pair does not have authority to obtain the third sum of stable value digital asset tokens; (8) determining, by the digital asset exchange system, the third designated key pair and the second designated key pair together have authority to obtain the third sum, and performing the following steps: (9) generating, by the digital asset exchange system, third instructions from the third designated public address to the first contract address to obtain the third sum of stable value digital asset tokens and transfer said third sum to the second requester public address; (10) transferring, from the digital asset exchange system to a third portable memory device, the third instructions; (11) transferring, from the third portable memory device to the third computer system, the third instructions; (12) digitally signing, by the third computer system, the third instructions using the third designated private key to generate third digitally signed instructions; (13) transferring, from the third computer system to a fourth portable memory device, the third digitally signed instructions; and (14) sending, from the fourth portable memory device to the plurality of geographically distributed computer systems, the third digitally signed instructions.

In embodiments, step (i)(14) includes the steps of: (A) transferring, from the fourth portable memory device to the digital asset exchange system, the third digitally signed instructions; and (B) transferring, from the digital asset exchange system to the plurality of geographically distributed computer systems, the third digitally signed instructions.

In embodiments, the third portable memory device and fourth portable memory device are the same portable memory device.

In embodiments, the third portable memory device and fourth portable memory device are different portable memory devices.

In embodiments, the method further includes the steps of: (k) providing a third designated key pair comprising a third designated public key and a corresponding third designated private key, wherein the third designated private key is stored on a third computer system which is physically separated from the first computer system and the second computer system and wherein the third computer system is not operatively connected or physically connected to the blockchain network; and wherein the first smart contract instructions further include: (F) authorization instructions associated with the third key pair; and wherein with respect to step (i), performing the following further steps: (7) determining the first designated key pair does not have authority to obtain the third sum; (8) determining the first designated key pair does not have authority to obtain the third sum; (9) determining, by the digital asset exchange system, that the third designated key pair, the second designated key pair and the first designated key pair together have authority to obtain the third sum; (10) sending a fifth request, from the digital asset exchange system to the first computer system, to obtain the third sum of stable value digital asset tokens and transfer said third sum to the second requester public address; (11) generating, by the digital asset exchange system, third instructions from the third designated public address to the first contract address to obtain the third sum of stable value digital asset tokens and transfer said third sum to the second requester public address; (12) transferring, from the digital asset exchange system to a third portable memory device, the third instructions; (13) transferring, from the third portable memory device to the third computer system, the third instructions; (14) digitally signing, by the third computer system, the third instructions using the third designated private key to generate third digitally signed instructions; (15) transferring, from the third computer system to a fourth portable memory device, the third digitally signed instructions; and (16) sending, from the fourth portable memory device to the plurality of geographically distributed computer systems, the third digitally signed instructions.

In embodiments, the step (i)(16) includes: (A) transferring, from the fourth portable memory device to the digital asset exchange system, the third digitally signed instructions; and (B) transferring, from the digital asset exchange system to the plurality of geographically distributed computer systems, the third digitally signed instructions.

In embodiments, the method further includes the steps of: (k) providing, by the digital asset exchange system a ledger including first account information associated with at least the first requesting user and second account information associated with at least the second requesting user, wherein the first account information includes first stable value digital asset token balance information and the second account information includes second stable value digital asset token balance information; (l) determining, by the digital asset exchange system, a total balance of the stable value digital asset tokens based on the sum of the first stable value digital asset token balance information and the second stable value digital asset token balance information; and (m) publishing, by the digital asset exchange system, the total balance of stable value digital asset tokens.

In embodiments, the method further includes the steps of: (k) generating, by a first requester computing device associated with the first requester, a transfer message to transfer stable value digital asset tokens to the second requester public address, the transfer message including: (1) a transfer number of stable value digital asset tokens; (2) the first requester public address; (3) the second requester public address; and (4) an electronic signature based on the first requester private key; (l) publishing, by the first requester computing device to the to the plurality of geographically distributed computer systems, the transfer message; and (m) confirming, by the first requester computing device, transfer of the number of stable value digital asset tokens from the first requester public address to the second requester public address by reference to the blockchain.

In embodiments, the first portable memory device and second portable memory device are the same portable memory device.

In embodiments, the first portable memory device and second portable memory device are different portable memory devices.

In embodiments, the fourth sum of currency is deposited in one or more bank accounts associated with the digital asset exchange.

In embodiments, the fourth sum of currency is used by the digital asset exchange to purchase one or more interest bearing financial instruments.

In embodiments, the authorization instructions associated with the first designated key pair include a limit on a number of tokens the first designated key pair is authorized to issue.

In embodiments, the authorization instructions associated with the first designated key pair include a time limit during which the first designated key pair is authorized to issue tokens.

In embodiments, the authorization instructions associated with the first designated key pair include a limit on a number of tokens the first designated key pair is authorized to issue over a period of time.

In embodiments, the currency is a fiat currency.

In embodiments, the fiat currency is U.S. dollar.

In embodiments, the fixed predetermined ratio is one stable value digital asset token is equal to one U.S. dollar.

In embodiments, the fixed predetermined ratio is one hundred stable value digital asset tokens is equal to one U.S. dollar.

In embodiments, the fiat currency is GB pound.

In embodiments, the fiat currency is SG dollar.

In embodiments, the fiat currency is EUR.

In embodiments, the fiat currency is HK dollar.

In embodiments, the fiat currency is Canadian dollar.

In embodiments, the fiat currency is Australian dollar.

In embodiments, the fiat currency is Yen.

In embodiments, the currency is a cryptocurrency.

In embodiments, the cryptocurrency is Bitcoin.

In embodiments, the cryptocurrency is Litecoin.

In embodiments, the cryptocurrency is Bitcoin Cash.

In embodiments, the cryptocurrency is Filecoin.

In embodiments, the cryptocurrency is Zcash.

In embodiments, the cryptocurrency is Stellar.

In embodiments, the cryptocurrency is Polkadot.

In embodiments, the cryptocurrency is Atom.

In embodiments, the cryptocurrency is Tezos.

In embodiments, the first designated public key is mathematically associated with the first designated private key.

In embodiments, the second designated public key is mathematically associated with the second designated private key.

In embodiments, the first contract instructions are based on the ERC720 standard.

In embodiments, the blockchain is the Ethereum blockchain.

In embodiments, the blockchain is the NEO blockchain.

In embodiments, the second sum of currency is deposited in one or more bank accounts associated with the digital asset exchange.

In embodiments, the second sum of currency is used by the digital asset exchange to purchase one or more interest bearing financial instruments.

In embodiments, the first request to obtain the first sum of stable value digital asset tokens specifies a requester fee payable to the digital asset exchange system in addition to the second sum of currency and step (d) includes confirming, by the digital asset exchange system, receipt of the second sum of currency and the requester fee.

In embodiments, the first request to obtain the first sum of stable value digital asset tokens specifies a miner fee payable to miners associated with the plurality of geographically distributed computer systems and step (d) includes confirming, by the digital asset exchange system, receipt of the second sum of currency and the miner fee.

In embodiments, a method of obtaining stable value digital asset tokens may comprise the steps of: (a) providing a first designated key pair comprising a first designated public key and a corresponding first designated private key, wherein the first designated private key also corresponds to a first designated public address associated with an underlying digital asset; wherein the underlying digital asset is maintained on a distributed public transaction ledger maintained in the form of a blockchain by a plurality of geographically distributed computer systems in a peer-to-peer network in the form of a blockchain network, and wherein the first designated private key is stored on a first computer system which is connected via the Internet to the blockchain network; (b) providing a second designated key pair comprising a second designated public key and a corresponding second designated private key, wherein the second designated private key also corresponds to a second designated public address associated with the underlying digital asset; and wherein the second designated private key is stored on a second computer system which is physically separated from the first computer system and is not operatively or physically connected to the blockchain network; (c) receiving, by a digital asset token issuer system, a request to obtain a first sum of stable value digital asset tokens in exchange for a second sum of currency, wherein the first sum corresponds to the second sum based on a fixed ratio of stable value digital asset token to currency, and wherein the request comes from a first requesting user with an associated first requester key pair, comprising a first requester public key and a corresponding first requester private key, wherein the first requester private key also corresponds to a first requester public address associated with the underlying digital asset; (d) confirming, by the digital asset token issuer system, receipt of the second sum of currency; (e) transferring the first sum of stable value digital asset tokens to the first requester public address using the following steps: (1) sending a second request, from the digital asset token issuer system to the first computer system, to obtain the first sum of stable value digital asset tokens and transfer said first sum to the first requester public address; (2) generating, by the first computer system, first instructions addressed from the first designated public address to a first contract address including a message to obtain the first sum of stable value digital asset tokens and to assign the obtained first sum to the first requester public address, wherein the first contract address is associated with the underlying digital asset, wherein the first contract address is associated with first smart contract instructions for a stable value digital asset token, and wherein the first smart contract instructions are saved as part of the blockchain for the underlying digital asset and include: (A) token creation instructions including instructions to create tokens; (B) token transfer instructions including instructions to transfer tokens; (C) token destruction instructions including instructions to destroy tokens; (D) authorization instructions associated with the first designated key pair; and (E) authorization instructions associated with the second designated key pair; (3) digitally signing, by the first computer system, the first instructions using the first designated private key to generate first digitally signed instructions; (4) sending, from the first computer system to the plurality of geographically distributed computer systems, the first digitally signed instructions; wherein the first digitally signed instructions are executed by the plurality of geographically distributed computer systems in accordance with the first contract instructions; and (f) confirming, by the digital asset token issuer system, that the first sum of stable value digital asset tokens has been obtained and transferred to the first requester public address based on reference to the blockchain.

In embodiments, the method further comprises the steps of: (g) receiving, by the digital asset token issuer system, a third request to obtain a third sum of stable value digital asset tokens in exchange for a fourth sum of currency, wherein the third sum corresponds to the fourth sum based on the fixed ratio of stable value digital asset token to currency, wherein the third request comes from a second requesting user with an associated second requester key pair, comprising a second requester public key and a corresponding second requester private key, and wherein the second requester private key is associated with a second requester public address associated with the underlying digital asset; (h) confirming, by the digital asset token issuer system, receipt of the fourth sum of currency; (i) transferring the third sum of stable value digital asset tokens to the second requester public address using the following steps: (1) generating, by the digital asset token issuer system, second instructions from the second designated public address to the first contract address to obtain the third sum of stable value digital asset tokens and transfer said third sum to the second requester public address; (2) transferring, from the digital asset token issuer system to a first portable memory device, the second instructions; (3) transferring, from the first portable memory device to the second computer, the second instructions; (4) digitally signing, by the second computer, the second instructions using the second designated private key to generate second digitally signed instructions; (5) transferring, from the second computer to a second portable memory device, the second digitally signed instructions; and (6) sending, from the second portable memory device to the plurality of geographically distributed computer systems, the second digitally signed instructions; and ( ) confirming, by the digital asset token issuer system, that the third sum of stable value digital asset tokens have been obtained and transferred to the second requester public address based on reference to the blockchain.

In embodiments, the step of (i)(6) includes: (A) transferring, from the second portable memory device to the digital asset token issuer system, the second digitally signed instructions: and (B) transferring, from the digital asset token issuer system to the plurality of geographically distributed computer systems, the second digitally signed instructions.

In embodiments, the method further comprises the steps of: (k) providing a third designated key pair comprising a third designated public key and a corresponding third designated private key, wherein the third designated private key is stored on a third computer system which is physically separated from the first computer system and the second computer system and wherein the third computer system is not operatively connected or physically connected to the blockchain network; wherein the first smart contract instructions include: (F) authorization instructions associated with the third designated key pair; and wherein with respect to step (i), performing the following further steps: (7) determining that the first designated key pair does not have authority to obtain the third sum of stable value digital asset tokens; (8) determining, by the digital asset token issuer system, the third designated key pair and the second designated key pair together have authority to obtain the third sum, and performing the following steps: (9) generating, by the digital asset token issuer system, third instructions from the third designated public address to the first contract address to obtain the third sum of stable value digital asset tokens and transfer said third sum to the second requester public address; (10) transferring, from the digital asset token issuer system to a third portable memory device, the third instructions; (11) transferring, from the third portable memory device to the third computer system, the third instructions; (12) digitally signing, by the third computer system, the third instructions using the third designated private key to generate third digitally signed instructions; (13) transferring, from the third computer system to a fourth portable memory device, the third digitally signed instructions; and (14) sending, from the fourth portable memory device to the plurality of geographically distributed computer systems, the third digitally signed instructions.

In embodiments, step (i)(14) includes the steps of: (A) transferring, from the fourth portable memory device to the digital asset token issuer system, the third digitally signed instructions; and (B) transferring, from the digital asset token issuer system to the plurality of geographically distributed computer systems, the third digitally signed instructions.

In embodiments, the third portable memory device and fourth portable memory device are the same portable memory device.

In embodiments, the third portable memory device and fourth portable memory device are different portable memory devices.

In embodiments, the method further includes the steps of: (k) providing a third designated key pair comprising a third designated public key and a corresponding third designated private key, wherein the third designated private key is stored on a third computer system which is physically separated from the first computer system and the second computer system and wherein the third computer system is not operatively connected or physically connected to the blockchain network; and wherein the first smart contract instructions further include: (F) authorization instructions associated with the third key pair; and wherein with respect to step (i), performing the following further steps: (7) determining the first designated key pair does not have authority to obtain the third sum; (8) determining the first designated key pair does not have authority to obtain the third sum; (9) determining, by the digital asset token issuer system, that the third designated key pair, the second designated key pair and the first designated key pair together have authority to obtain the third sum; (10) sending a fifth request, from the digital asset token issuer system to the first computer system, to obtain the third sum of stable value digital asset tokens and transfer said third sum to the second requester public address; (11) generating, by the digital asset token issuer system, third instructions from the third designated public address to the first contract address to obtain the third sum of stable value digital asset tokens and transfer said third sum to the second requester public address; (12) transferring, from the digital asset token issuer system to a third portable memory device, the third instructions; (13) transferring, from the third portable memory device to the third computer system, the third instructions; (14) digitally signing, by the third computer system, the third instructions using the third designated private key to generate third digitally signed instructions; (15) transferring, from the third computer system to a fourth portable memory device, the third digitally signed instructions; and (16) sending, from the fourth portable memory device to the plurality of geographically distributed computer systems, the third digitally signed instructions.

In embodiments, the step (i)(16) includes: (A) transferring, from the fourth portable memory device to the digital asset token issuer system, the third digitally signed instructions; and (B) transferring, from the digital asset token issuer system to the plurality of geographically distributed computer systems, the third digitally signed instructions.

In embodiments, the method further includes the steps of: (k) providing, by the digital asset token issuer system a ledger including first account information associated with at least the first requesting user and second account information associated with at least the second requesting user, wherein the first account information includes first stable value digital asset token balance information and the second account information includes second stable value digital asset token balance information; (l) determining, by the digital asset token issuer system, a total balance of the stable value digital asset tokens based on the sum of the first stable value digital asset token balance information and 1 the second stable value digital asset token balance information; and (m) publishing, by the digital asset token issuer system, the total balance of stable value digital asset tokens.

In embodiments, the method further includes the steps of: (k) generating, by a first requester computing device associated with the first requester, a transfer message to transfer stable value digital asset tokens to the second requester public address, the transfer message including: (1) a transfer number of stable value digital asset tokens; (2) the first requester public address; (3) the second requester public address; and (4) an electronic signature based on the first requester private key; (l) publishing, by the first requester computing device to the to the plurality of geographically distributed computer systems, the transfer message; and (m) confirming, by the first requester computing device, transfer of the number of stable value digital asset tokens from the first requester public address to the second requester public address by reference to the blockchain.

In embodiments, the first portable memory device and second portable memory device are the same portable memory device.

In embodiments, the first portable memory device and second portable memory device are different portable memory devices.

In embodiments, the fourth sum of currency is deposited in one or more bank accounts associated with the digital asset token issuer.

In embodiments, the fourth sum of currency is used by the digital asset token issuer to purchase one or more interest bearing financial instruments.

In embodiments, the authorization instructions associated with the first designated key pair include a limit on a number of tokens the first designated key pair is authorized to issue.

In embodiments, the authorization instructions associated with the first designated key pair include a time limit during which the first designated key pair is authorized to issue tokens.

In embodiments, the authorization instructions associated with the first designated key pair include a limit on a number of tokens the first designated key pair is authorized to issue over a period of time.

In embodiments, the currency is a flat currency.

In embodiments, the fiat currency is U.S. dollar.

In embodiments, the fixed predetermined ratio is one stable value digital asset token is equal to one U.S. dollar.

In embodiments, the fixed predetermined ratio is one hundred stable value digital asset tokens is equal to one U.S. dollar.

In embodiments, the fiat currency is GB pound.

In embodiments, the fiat currency is SG dollar.

In embodiments, the fiat currency is EUR.

In embodiments, the fiat currency is HK dollar.

In embodiments, the fiat currency is Canadian dollar.

In embodiments, the fiat currency is Australian dollar.

In embodiments, the flat currency is Yen.

In embodiments, the currency is a cryptocurrency.

In embodiments, the cryptocurrency is Bitcoin.

In embodiments, the cryptocurrency is Litecoin.

In embodiments, the cryptocurrency is Bitcoin Cash.

In embodiments, the cryptocurrency is Filecoin.

In embodiments, the cryptocurrency is Zcash.

In embodiments, the cryptocurrency is Stellar.

In embodiments, the cryptocurrency is Polkadot.

In embodiments, the cryptocurrency is Atom.

In embodiments, the cryptocurrency is Tezos.

In embodiments, the first designated public key is mathematically associated with the first designated private key.

In embodiments, the second designated public key is mathematically associated with the second designated private key.

In embodiments, the first contract instructions are based on the ERC720 standard.

In embodiments, the blockchain is the Ethereum blockchain.

In embodiments, the blockchain is the NEO blockchain.

In embodiments, the second sum of currency is deposited in one or more bank accounts associated with the digital asset token issuer.

In embodiments, the second sum of currency is used by the digital asset token issuer to purchase one or more interest bearing financial instruments.

In embodiments, the first request to obtain the first sum of stable value digital asset tokens specifies a requester fee payable to the digital asset token issuer system in addition to the second sum of currency and step (d) includes confirming, by the digital asset token issuer system, receipt of the second sum of currency and the requester fee.

In embodiments, the first request to obtain the first sum of stable value digital asset tokens specifies a miner fee payable to miners associated with the plurality of geographically distributed computer systems and step (d) includes confirming, by the digital asset token issuer system, receipt of the second sum of currency and the miner fee.

In embodiments, a method of obtaining stable value digital asset tokens may comprise the steps of: (a) providing a first designated key pair comprising a first designated public key and a corresponding first designated private key, wherein the first designated private key also corresponds to a first designated public address associated with an underlying digital asset, wherein the underlying digital asset is maintained on a distributed public transaction ledger by a first plurality of geographically distributed computer systems in a first peer-to-peer network in the form of a first blockchain, and wherein the first designated private key is stored on a first computer system which is connected via the Internet to the first peer-to-peer network; (b) providing a second designated key pair comprising a second designated public key and a corresponding second designated private key, wherein the second designated private key also corresponds to a second designated public address associated with the underlying digital asset; and wherein the second designated private key is stored on a second computer system which is physically separated from the first computer system and is not operatively or physically connected to the first peer-to-peer network; (c) providing first smart contract instructions for a stable value digital asset token associated with a first contract address associated with the underlying digital asset, wherein the smart contract instructions are saved as part of the first blockchain for the underlying digital asset and include: (1) token creation instructions including instructions to create tokens; (2) token transfer instructions including instructions to transfer tokens; (3) token destruction instructions including instructions to destroy tokens; (4) authorization instructions associated with the first designated key pair; and (5) authorization instructions associated with the second designated key pair; (d) receiving, by an administrator system, a request to obtain a first sum of stable value digital asset tokens in exchange for a second sum of a second digital asset, wherein the second digital asset is maintained on a second distributed public transaction ledger maintained by a second plurality of geographically distributed computer systems in a second peer-to-peer network in the form of a second blockchain; wherein the first sum corresponds to the second sum based on a fixed ratio of stable value digital asset token to second digital asset, and wherein the request comes from a first requesting user with an associated first requester key pair, comprising a first requester public key and a corresponding first requester private key, wherein the first requester private key also corresponds to a first requester public address associated with the underlying digital asset; (e) confirming, by the administrator system, receipt of the second sum of the second digital asset on the second blockchain; (f) transferring the first sum of stable value digital asset tokens to the first requester public address using the following steps: (1) sending a second request, from the administrator system to the first computer system, to obtain the first sum of stable value digital asset tokens and transfer said first sum to the first requester public address; (2) generating, by the first computer system, first instructions addressed from the first designated public address to the first contract address including a message to obtain the first sum of stable value digital asset tokens and to assign the obtained first sum to the first requester public address; (3) digitally signing, by the first computer system, the first instructions using the first designated private key to generate first digitally signed instructions; and (4) sending, from the first computer system to the first plurality of geographically distributed computer systems, the first digitally signed instructions, wherein the first digitally signed instructions are executed by the first plurality of geographically distributed computer systems in accordance with the first contract instructions; and (g) confirming, by the administrator system, that the first sum of stable value digital asset tokens has been obtained and transferred to the first requester public address based on reference to the first blockchain.

In embodiments, the method further comprises the steps of: (h) receiving, by the administrator system, a third request to obtain a third sum of stable value digital asset tokens in exchange for a fourth sum of the second digital asset, wherein the third sum corresponds to the fourth sum based on a second fixed notional amount, wherein the third request comes from a second requesting user with an associated second requester key pair, comprising a second requester public key and a corresponding second requester private key, and wherein the second requester private key is associated with a second requester public address associated with the underlying digital asset; (i) confirming, by the administrator system, receipt of the fourth sum of the second digital asset; (j) transferring the third sum of stable value digital asset tokens to the second requester public address using the following steps: (1) generating, by the administrator system, second instructions from the second designated public address to the first contract address to obtain the third sum of stable value digital asset tokens and transfer said third sum to the second requester public address; (2) transferring, from the administrator system to a first portable memory device, the second instructions; (3) transferring, from the first portable memory device to the second computer, the second instructions; (4) digitally signing, by the second computer, the second instructions using the second designated private key to generate second digitally signed instructions: (5) transferring, from the second computer to a second portable memory device, the second digitally signed instructions, and (6) sending, from the second portable memory device to the first plurality of geographically distributed computer systems, the second digitally signed instructions; and (k) confirming, by the administrator system, that the third sum of stable value digital asset tokens have been obtained and transferred to the second requester public address based on reference to the first blockchain.

In embodiments, the step of (j)(6) includes steps of: (i) transferring, from the second portable memory device to the administrator system, the second digitally signed instructions; and (ii) transferring, from the administrator system to the plurality of geographically distributed computer systems, the second digitally signed instructions.

In embodiments, the method further comprises the steps of: (l) providing a third designated key pair comprising a third designated public key and a corresponding third designated private key, wherein the third designated private key is stored on a third computer system which is physically separated from the first computer system and the second computer system, wherein the third computer system is not operatively connected or physically connected to the peer-to-peer network, and wherein the first smart contract instructions further include: (6) authorization instructions associated with the third designated key pair, and wherein, with respect to step (j), performing the following further steps: (7) determining that the first designated key pair does not have authority to obtain the third sum of stable value digital asset tokens; (8) determining, by the administrator system, the third designated key pair and the second designated key pair together have authority to obtain the third sum; (9) generating, by the administrator system, third instructions from the third designated public address to the first contract address to obtain the third sum of stable value digital asset tokens and transfer said third sum to the second requester public address; (10) transferring, from the administrator system to a third portable memory device, the third instructions; (11) transferring, from the third portable memory device to the third computer system, the third instructions; (12) digitally signing, by the third computer system, the third instructions using the third designated private key to generate third digitally signed instructions; (13) transferring, from the third computer system to a fourth portable memory device, the third digitally signed instructions; and (14) sending, from the fourth portable memory device to the first plurality of geographically distributed computer systems, the third digitally signed instructions.

In embodiments, step (j)(14) includes the steps of: (A) transferring, from the fourth portable memory device to the administrator system, the third digitally signed instructions; and (B) transferring, from the administrator system to the plurality of geographically distributed computer systems, the third digitally signed instructions.

In embodiments, the third portable memory device and fourth portable memory device are the same portable memory device.

In embodiments, the third portable memory device and fourth portable memory device are different portable memory devices.

In embodiments, the first portable memory device and second portable memory device are the same portable memory device.

In embodiments, the first portable memory device and second portable memory device are different portable memory devices.

In embodiments, the method further includes the steps of: (1) providing a third designated key pair comprising a third designated public key and a corresponding third designated private key, wherein the third designated private key is stored on a third computer system which is physically separated from the first computer system and the second computer system and wherein the third computer system is not operatively connected or physically connected to the first peer-to-peer network; and wherein the first smart contract instructions further include: (6) authorization instructions associated with the third key pair, and wherein with respect to step (j), performing the following further steps: (7) determining the first designated key pair does not have authority to obtain the third sum; (8) determining the first designated key pair does not have authority to obtain the third sum; (9) determining, by the administrator system, that the third designated key pair, the second designated key pair and the first designated key pair together have authority to obtain the third sum; (10) sending a fifth request, from the administrator system to the first computer system, to obtain the third sum of stable value digital asset tokens and transfer said third sum to the second requester public address; (11) generating, by the administrator system, third instructions from the third designated public address to the first contract address to obtain the third sum of stable value digital asset tokens and transfer said third sum to the second requester public address; (12) transferring, from the administrator system to a third portable memory device, the third instructions; (13) transferring, from the third portable memory device to the third computer system, the third instructions; (14) digitally signing, by the third computer system, the third instructions using the third designated private key to generate third digitally signed instructions; (15) transferring, from the third computer system to a fourth portable memory device, the third digitally signed instructions; and (16) sending, from the fourth portable memory device to the first plurality of geographically distributed computer systems, the third digitally signed instructions.

In embodiments, the step (j)(16) includes the steps of: (A) transferring, from the fourth portable memory device to the administrator system, the third digitally signed instructions, and (B) transferring, from the administrator system to the plurality of geographically distributed computer systems, the third digitally signed instructions.

In embodiments, the fourth sum of the second digital asset is deposited into one or more public addresses on the second blockchain associated with the administrator.

In embodiments, the fourth sum of the second digital asset is used by the administrator to purchase one or more interest bearing financial instruments.

In embodiments, the method further includes the steps of: (1) generating, by a first requester computing device associated with the first requester, a transfer message to transfer stable value digital asset tokens to the second requester public address, the transfer message including: (1) a transfer number of stable value digital asset tokens; (2) the first requester public address; (3) the second requester public address; and (4) an electronic signature based on the first requester private key; (m) publishing, by the first requester computing device to the to the first plurality of geographically distributed computer systems, the transfer message; and (n) confirming, by the first requester computing device, the transfer of the transfer number of stable value digital asset tokens from the first requester public address to the second requester public address by reference to the first blockchain.

In embodiments, the authorization instructions associated with the first designated key pair include a limit on a number of tokens the first designated key pair is authorized to issue.

In embodiments, the authorization instructions associated with the first designated key pair include a time limit during which the first designated key pair is authorized to issue tokens.

In embodiments, the authorization instructions associated with the first designated key pair include a limit on a number of tokens the first designated key pair is authorized to issue over a period of time.

In embodiments, the second digital asset is Bitcoin.

In embodiments, the second digital asset is Bitcoin Cash.

In embodiments, the second digital asset is Stellar.

In embodiments, the second digital asset is Filecoin.

In embodiments, the second digital asset is Litecoin.

In embodiments, the second digital asset is Tezos.

In embodiments, the second digital asset is Zcash.

In embodiments, the first designated public key is mathematically associated with the first designated private key.

In embodiments, the second designated public key is mathematically associated with the second designated private key.

In embodiments, the first contract instructions are based on the ERC720 standard.

In embodiments, the first blockchain is an Ethereum blockchain.

In embodiments, the first blockchain is a NEO blockchain.

In embodiments, the first blockchain is an Ether Classic blockchain.

In embodiments, the first request to obtain the first sum of stable value digital asset tokens specifies a requester fee payable to the administrator system in addition to the second sum of the second digital asset and step (e) includes confirming, by the administrator system, receipt of the second sum of the second digital asset and the requester fee.

In embodiments, the first request to obtain the first sum of stable value digital asset tokens specifies a miner fee payable to miners associated with the first plurality of geographically distributed computer systems and step (e) includes confirming, by the administrator system, receipt of the second sum of the second digital asset and the miner fee.

In embodiments, a method of obtaining stable value digital asset tokens may comprise the steps of: (a) providing a first designated key pair comprising a first designated public key and a corresponding first designated private key, wherein the first designated private key also corresponds to a first designated public address associated with an underlying digital asset, wherein the underlying digital asset is maintained on a distributed public transaction ledger by a first plurality of geographically distributed computer systems in a first peer-to-peer network in the form of a first blockchain, and wherein the first designated private key is stored on a first computer system which is connected via the Internet to the first peer-to-peer network; (b) providing a second designated key pair comprising a second designated public key and a corresponding second designated private key, wherein the second designated private key also corresponds to a second designated public address associated with the underlying digital asset; and wherein the second designated private key is stored on a second computer system which is physically separated from the first computer system and is not operatively or physically connected to the first peer-to-peer network; (c) providing first smart contract instructions for a stable value digital asset token associated with a first contract address associated with the underlying digital asset, wherein the smart contract instructions are saved as part of the first blockchain for the underlying digital asset and include: (1) token creation instructions including instructions to create tokens; (2) token transfer instructions including instructions to transfer tokens; (3) token destruction instructions including instructions to destroy tokens; (4) authorization instructions associated with the first designated key pair; and (5) authorization instructions associated with the second designated key pair; (d) receiving, by a digital asset exchange system, a request to obtain a first sum of stable value digital asset tokens in exchange for a second sum of a second digital asset, wherein the second digital asset is maintained on a second distributed public transaction ledger maintained by a second plurality of geographically distributed computer systems in a second peer-to-peer network in the form of a second blockchain; wherein the first sum corresponds to the second sum based on a fixed ratio of stable value digital asset token to second digital asset, and wherein the request comes from a first requesting user with an associated first requester key pair, comprising a first requester public key and a corresponding first requester private key, wherein the first requester private key also corresponds to a first requester public address associated with the underlying digital asset; (e) confirming, by the digital asset exchange system, receipt of the second sum of the second digital asset on the second blockchain; (f) transferring the first sum of stable value digital asset tokens to the first requester public address using the following steps: (1) sending a second request, from the digital asset exchange system to the first computer system, to obtain the first sum of stable value digital asset tokens and transfer said first sum to the first requester public address; (2) generating, by the first computer system, first instructions addressed from the first designated public address to the first contract address including a message to obtain the first sum of stable value digital asset tokens and to assign the obtained first sum to the first requester public address; (3) digitally signing, by the first computer system, the first instructions using the first designated private key to generate first digitally signed instructions; and (4) sending, from the first computer system to the first plurality of geographically distributed computer systems, the first digitally signed instructions, wherein the first digitally signed instructions are executed by the first plurality of geographically distributed computer systems in accordance with the first contract instructions; and (g) confirming, by the digital asset exchange system, that the first sum of stable value digital asset tokens has been obtained and transferred to the first requester public address based on reference to the first blockchain.

In embodiments, the method further comprises the steps of: (h) receiving, by the digital asset exchange system, a third request to obtain a third sum of stable value digital asset tokens in exchange for a fourth sum of the second digital asset, wherein the third sum corresponds to the fourth sum based on a second fixed notional amount, wherein the third request comes from a second requesting user with an associated second requester key pair, comprising a second requester public key and a corresponding second requester private key, and wherein the second requester private key is associated with a second requester public address associated with the underlying digital asset; (i) confirming, by the digital asset exchange system, receipt of the fourth sum of the second digital asset; (j) transferring the third sum of stable value digital asset tokens to the second requester public address using the following steps: (1) generating, by the digital asset exchange system, second instructions from the second designated public address to the first contract address to obtain the third sum of stable value digital asset tokens and transfer said third sum to the second requester public address; (2) transferring, from the digital asset exchange system to a first portable memory device, the second instructions; (3) transferring, from the first portable memory device to the second computer, the second instructions; (4) digitally signing, by the second computer, the second instructions using the second designated private key to generate second digitally signed instructions; (5) transferring, from the second computer to a second portable memory device, the second digitally signed instructions; and (6) sending, from the second portable memory device to the first plurality of geographically distributed computer systems, the second digitally signed instructions; and (k) confirming, by the digital asset exchange system, that the third sum of stable value digital asset tokens have been obtained and transferred to the second requester public address based on reference to the first blockchain.

In embodiments, the step of ( )(6) includes steps of: (i) transferring, from the second portable memory device to the digital asset exchange system, the second digitally signed instructions; and (ii) transferring, from the digital asset exchange system to the plurality of geographically distributed computer systems, the second digitally signed instructions.

In embodiments, the method further comprises the steps of: (l) providing a third designated key pair comprising a third designated public key and a corresponding third designated private key, wherein the third designated private key is stored on a third computer system which is physically separated from the first computer system and the second computer system, wherein the third computer system is not operatively connected or physically connected to the peer-to-peer network, and wherein the first smart contract instructions further include: (6) authorization instructions associated with the third designated key pair, and wherein, with respect to step (j), performing the following further steps: (7) determining that the first designated key pair does not have authority to obtain the third sum of stable value digital asset tokens; (8) determining, by the digital asset exchange system, the third designated key pair and the second designated key pair together have authority to obtain the third sum; (9) generating, by the digital asset exchange system, third instructions from the third designated public address to the first contract address to obtain the third sum of stable value digital asset tokens and transfer said third sum to the second requester public address; (10) transferring, from the digital asset exchange system to a third portable memory device, the third instructions; (11) transferring, from the third portable memory device to the third computer system, the third instructions; (12) digitally signing, by the third computer system, the third instructions using the third designated private key to generate third digitally signed instructions; (13) transferring, from the third computer system to a fourth portable memory device, the third digitally signed instructions; and (14) sending, from the fourth portable memory device to the first plurality of geographically distributed computer systems, the third digitally signed instructions.

In embodiments, step (j)(14) includes the steps of: (A) transferring, from the fourth portable memory device to the digital asset exchange system, the third digitally signed instructions; and (B) transferring, from the digital asset exchange system to the plurality of geographically distributed computer systems, the third digitally signed instructions.

In embodiments, the third portable memory device and fourth portable memory device are the same portable memory device.

In embodiments, the third portable memory device and fourth portable memory device are different portable memory devices.

In embodiments, the first portable memory device and second portable memory device are the same portable memory device.

In embodiments, the first portable memory device and second portable memory device are different portable memory devices.

In embodiments, the method further includes the steps of: (l) providing a third designated key pair comprising a third designated public key and a corresponding third designated private key, wherein the third designated private key is stored on a third computer system which is physically separated from the first computer system and the second computer system and wherein the third computer system is not operatively connected or physically connected to the first peer-to-peer network; and wherein the first smart contract instructions further include: (6) authorization instructions associated with the third key pair, and wherein with respect to step (j), performing the following further steps: (7) determining the first designated key pair does not have authority to obtain the third sum; (8) determining the first designated key pair does not have authority to obtain the third sum; (9) determining, by the digital asset exchange system, that the third designated key pair, the second designated key pair and the first designated key pair together have authority to obtain the third sum; (10) sending a fifth request, from the digital asset exchange system to the first computer system, to obtain the third sum of stable value digital asset tokens and transfer said third sum to the second requester public address; (11) generating, by the digital asset exchange system, third instructions from the third designated public address to the first contract address to obtain the third sum of stable value digital asset tokens and transfer said third sum to the second requester public address; (12) transferring, from the digital asset exchange system to a third portable memory device, the third instructions; (13) transferring, from the third portable memory device to the third computer system, the third instructions; (14) digitally signing, by the third computer system, the third instructions using the third designated private key to generate third digitally signed instructions; (15) transferring, from the third computer system to a fourth portable memory device, the third digitally signed instructions; and (16) sending, from the fourth portable memory device to the first plurality of geographically distributed computer systems, the third digitally signed instructions.

In embodiments, the step (j)(16) includes the steps of: (A) transferring, from the fourth portable memory device to the digital asset exchange system, the third digitally signed instructions; and (B) transferring, from the digital asset exchange system to the plurality of geographically distributed computer systems, the third digitally signed instructions.

In embodiments, the fourth sum of the second digital asset is deposited into one or more public addresses on the second blockchain associated with the digital asset exchange.

In embodiments, the fourth sum of the second digital asset is used by the digital asset exchange to purchase one or more interest bearing financial instruments.

In embodiments, the method further includes the steps of: (1) generating, by a first requester computing device associated with the first requester, a transfer message to transfer stable value digital asset tokens to the second requester public address, the transfer message including: (1) a transfer number of stable value digital asset tokens; (2) the first requester public address; (3) the second requester public address; and (4) an electronic signature based on the first requester private key; (m) publishing, by the first requester computing device to the to the first plurality of geographically distributed computer systems, the transfer message; and (n) confirming, by the first requester computing device, the transfer of the transfer number of stable value digital asset tokens from the first requester public address to the second requester public address by reference to the first blockchain.

In embodiments, the authorization instructions associated with the first designated key pair include a limit on a number of tokens the first designated key pair is authorized to issue.

In embodiments, the authorization instructions associated with the first designated key pair include a time limit during which the first designated key pair is authorized to issue tokens.

In embodiments, the authorization instructions associated with the first designated key pair include a limit on a number of tokens the first designated key pair is authorized to issue over a period of time.

In embodiments, the second digital asset is Bitcoin.

In embodiments, the second digital asset is Bitcoin Cash.

In embodiments, the second digital asset is Stellar.

In embodiments, the second digital asset is Filecoin.

In embodiments, the second digital asset is Litecoin.

In embodiments, the second digital asset is Tezos.

In embodiments, the second digital asset is Zcash.

In embodiments, the first designated public key is mathematically associated with the first designated private key.

In embodiments, the second designated public key is mathematically associated with the second designated private key.

In embodiments, the first contract instructions are based on the ERC720 standard.

In embodiments, the first blockchain is an Ethereum blockchain.

In embodiments, the first blockchain is a NEO blockchain.

In embodiments, the first blockchain is an Ether Classic blockchain.

In embodiments, the first request to obtain the first sum of stable value digital asset tokens specifies a requester fee payable to the digital asset exchange system in addition to the second sum of the second digital asset and step (e) includes confirming, by the digital asset exchange system, receipt of the second sum of the second digital asset and the requester fee.

In embodiments, the first request to obtain the first sum of stable value digital asset tokens specifies a miner fee payable to miners associated with the first plurality of geographically distributed computer systems and step (e) includes confirming, by the digital asset exchange system, receipt of the second sum of the second digital asset and the miner fee.

In embodiments, a method of obtaining stable value digital asset tokens may comprise the steps of: (a) providing a first designated key pair comprising a first designated public key and a corresponding first designated private key, wherein the first designated private key also corresponds to a first designated public address associated with an underlying digital asset, wherein the underlying digital asset is maintained on a distributed public transaction ledger by a first plurality of geographically distributed computer systems in a first peer-to-peer network in the form of a first blockchain, and wherein the first designated private key is stored on a first computer system which is connected via the Internet to the first peer-to-peer network; (b) providing a second designated key pair comprising a second designated public key and a corresponding second designated private key, wherein the second designated private key also corresponds to a second designated public address associated with the underlying digital asset; and wherein the second designated private key is stored on a second computer system which is physically separated from the first computer system and is not operatively or physically connected to the first peer-to-peer network; (c) providing first smart contract instructions for a stable value digital asset token associated with a first contract address associated with the underlying digital asset, wherein the smart contract instructions are saved as part of the first blockchain for the underlying digital asset and include: (1) token creation instructions including instructions to create tokens; (2) token transfer instructions including instructions to transfer tokens; (3) token destruction instructions including instructions to destroy tokens; (4) authorization instructions associated with the first designated key pair; and (5) authorization instructions associated with the second designated key pair; (d) receiving, by a digital asset token issuer system, a request to obtain a first sum of stable value digital asset tokens in exchange for a second sum of a second digital asset, wherein the second digital asset is maintained on a second distributed public transaction ledger maintained by a second plurality of geographically distributed computer systems in a second peer-to-peer network in the form of a second blockchain; wherein the first sum corresponds to the second sum based on a fixed ratio of stable value digital asset token to second digital asset, and wherein the request comes from a first requesting user with an associated first requester key pair, comprising a first requester public key and a corresponding first requester private key, wherein the first requester private key also corresponds to a first requester public address associated with the underlying digital asset; (e) confirming, by the digital asset token issuer system, receipt of the second sum of the second digital asset on the second blockchain; (f) transferring the first sum of stable value digital asset tokens to the first requester public address using the following steps: (1) sending a second request, from the digital asset token issuer system to the first computer system, to obtain the first sum of stable value digital asset tokens and transfer said first sum to the first requester public address; (2) generating, by the first computer system, first instructions addressed from the first designated public address to the first contract address including a message to obtain the first sum of stable value digital asset tokens and to assign the obtained first sum to the first requester public address; (3) digitally signing, by the first computer system, the first instructions using the first designated private key to generate first digitally signed instructions; and (4) sending, from the first computer system to the first plurality of geographically distributed computer systems, the first digitally signed instructions, wherein the first digitally signed instructions are executed by the first plurality of geographically distributed computer systems in accordance with the first contract instructions; and (g) confirming, by the digital asset token issuer system, that the first sum of stable value digital asset tokens has been obtained and transferred to the first requester public address based on reference to the first blockchain.

In embodiments, the method further comprises the steps of: (h) receiving, by the digital asset token issuer system, a third request to obtain a third sum of stable value digital asset tokens in exchange for a fourth sum of the second digital asset, wherein the third sum corresponds to the fourth sum based on a second fixed notional amount, wherein the third request comes from a second requesting user with an associated second requester key pair, comprising a second requester public key and a corresponding second requester private key, and wherein the second requester private key is associated with a second requester public address associated with the underlying digital asset; (i) confirming, by the digital asset token issuer system, receipt of the fourth sum of the second digital asset; (j) transferring the third sum of stable value digital asset tokens to the second requester public address using the following steps: (1) generating, by the digital asset token issuer system, second instructions from the second designated public address to the first contract address to obtain the third sum of stable value digital asset tokens and transfer said third sum to the second requester public address; (2) transferring, from the digital asset token issuer system to a first portable memory device, the second instructions; (3) transferring, from the first portable memory device to the second computer, the second instructions; (4) digitally signing, by the second computer, the second instructions using the second designated private key to generate second digitally signed instructions; (5) transferring, from the second computer to a second portable memory device, the second digitally signed instructions; and (6) sending, from the second portable memory device to the first plurality of geographically distributed computer systems, the second digitally signed instructions; and (k) confirming, by the digital asset token issuer system, that the third sum of stable value digital asset tokens have been obtained and transferred to the second requester public address based on reference to the first blockchain.

In embodiments, the step of (j)(6) includes steps of: (i) transferring, from the second portable memory device to the digital asset token issuer system, the second digitally signed instructions; and (ii) transferring, from the digital asset token issuer system to the plurality of geographically distributed computer systems, the second digitally signed instructions.

In embodiments, the method further comprises the steps of: (1) providing a third designated key pair comprising a third designated public key and a corresponding third designated private key, wherein the third designated private key is stored on a third computer system which is physically separated from the first computer system and the second computer system, wherein the third computer system is not operatively connected or physically connected to the peer-to-peer network, and wherein the first smart contract instructions further include: (6) authorization instructions associated with the third designated key pair, and wherein, with respect to step (j), performing the following further steps: (7) determining that the first designated key pair does not have authority to obtain the third sum of stable value digital asset tokens; (8) determining, by the digital asset token issuer system, the third designated key pair and the second designated key pair together have authority to obtain the third sum; (9) generating, by the digital asset token issuer system, third instructions from the third designated public address to the first contract address to obtain the third sum of stable value digital asset tokens and transfer said third sum to the second requester public address; (10) transferring, from the digital asset token issuer system to a third portable memory device, the third instructions; (11) transferring, from the third portable memory device to the third computer system, the third instructions; (12) digitally signing, by the third computer system, the third instructions using the third designated private key to generate third digitally signed instructions; (13) transferring, from the third computer system to a fourth portable memory device, the third digitally signed instructions; and (14) sending, from the fourth portable memory device to the first plurality of geographically distributed computer systems, the third digitally signed instructions.

In embodiments, step ( )(14) includes the steps of: (A) transferring, from the fourth portable memory device to the digital asset token issuer system, the third digitally signed instructions; and (B) transferring, from the digital asset token issuer system to the plurality of geographically distributed computer systems, the third digitally signed instructions.

In embodiments, the third portable memory device and fourth portable memory device are the same portable memory device.

In embodiments, the third portable memory device and fourth portable memory device are different portable memory devices.

In embodiments, the first portable memory device and second portable memory device are the same portable memory device.

In embodiments, the first portable memory device and second portable memory device are different portable memory devices.

In embodiments, the method further includes the steps of: (1) providing a third designated key pair comprising a third designated public key and a corresponding third designated private key, wherein the third designated private key is stored on a third computer system which is physically separated from the first computer system and the second computer system and wherein the third computer system is not operatively connected or physically connected to the first peer-to-peer network; and wherein the first smart contract instructions further include: (6) authorization instructions associated with the third key pair, and wherein with respect to step (j), performing the following further steps: (7) determining the first designated key pair does not have authority to obtain the third sum; (8) determining the first designated key pair does not have authority to obtain the third sum; (9) determining, by the digital asset token issuer system, that the third designated key pair, the second designated key pair and the first designated key pair together have authority to obtain the third sum; (10) sending a fifth request, from the digital asset token issuer system to the first computer system, to obtain the third sum of stable value digital asset tokens and transfer said third sum to the second requester public address; (11) generating, by the digital asset token issuer system, third instructions from the third designated public address to the first contract address to obtain the third sum of stable value digital asset tokens and transfer said third sum to the second requester public address; (12) transferring, from the digital asset token issuer system to a third portable memory device, the third instructions; (13) transferring, from the third portable memory device to the third computer system, the third instructions; (14) digitally signing, by the third computer system, the third instructions using the third designated private key to generate third digitally signed instructions; (15) transferring, from the third computer system to a fourth portable memory device, the third digitally signed instructions; and (16) sending, from the fourth portable memory device to the first plurality of geographically distributed computer systems, the third digitally signed instructions.

In embodiments, the step (j)(16) includes the steps of: (A) transferring, from the fourth portable memory device to the digital asset token issuer system, the third digitally signed instructions; and (B) transferring, from the digital asset token issuer system to the plurality of geographically distributed computer systems, the third digitally signed instructions.

In embodiments, the fourth sum of the second digital asset is deposited into one or more public addresses on the second blockchain associated with the digital asset token issuer.

In embodiments, the fourth sum of the second digital asset is used by the digital asset token issuer to purchase one or more interest bearing financial instruments.

In embodiments, the method further includes the steps of: (1) generating, by a first requester computing device associated with the first requester, a transfer message to transfer stable value digital asset tokens to the second requester public address, the transfer message including: (1) a transfer number of stable value digital asset tokens; (2) the first requester public address; (3) the second requester public address; and (4) an electronic signature based on the first requester private key; (m) publishing, by the first requester computing device to the to the first plurality of geographically distributed computer systems, the transfer message; and (n) confirming, by the first requester computing device, the transfer of the transfer number of stable value digital asset tokens from the first requester public address to the second requester public address by reference to the first blockchain.

In embodiments, the authorization instructions associated with the first designated key pair include a limit on a number of tokens the first designated key pair is authorized to issue.

In embodiments, the authorization instructions associated with the first designated key pair include a time limit during which the first designated key pair is authorized to issue tokens.

In embodiments, the authorization instructions associated with the first designated key pair include a limit on a number of tokens the first designated key pair is authorized to issue over a period of time.

In embodiments, the second digital asset is Bitcoin.

In embodiments, the second digital asset is Bitcoin Cash.

In embodiments, the second digital asset is Stellar.

In embodiments, the second digital asset is Filecoin.

In embodiments, the second digital asset is Litecoin.

In embodiments, the second digital asset is Tezos.

In embodiments, the second digital asset is Zcash.

In embodiments, the first designated public key is mathematically associated with the first designated private key.

In embodiments, the second designated public key is mathematically associated with the second designated private key.

In embodiments, the first contract instructions are based on the ERC720 standard.

In embodiments, the first blockchain is an Ethereum blockchain.

In embodiments, the first blockchain is a NEO blockchain.

In embodiments, the first blockchain is an Ether Classic blockchain.

In embodiments, the first request to obtain the first sum of stable value digital asset tokens specifies a requester fee payable to the digital asset token issuer system in addition to the second sum of the second digital asset and step (e) includes confirming, by the digital asset token issuer system, receipt of the second sum of the second digital asset and the requester fee.

In embodiments, the first request to obtain the first sum of stable value digital asset tokens specifies a miner fee payable to miners associated with the first plurality of geographically distributed computer systems and step (e) includes confirming, by the digital asset token issuer system, receipt of the second sum of the second digital asset and the miner fee.

In embodiments, a method of obtaining stable value digital asset tokens may comprise the steps of: (a) providing a first designated key pair comprising a first designated public key and a corresponding first designated private key, wherein the first designated private key also corresponds to a first designated public address associated with an underlying digital asset, wherein the underlying digital asset is maintained on a distributed public transaction ledger by a first plurality of geographically distributed computer systems in a first peer-to-peer network in the form of a first blockchain, and wherein the first designated private key is stored on a first computer system which is connected via the Internet to the first peer-to-peer network; (b) providing a second designated key pair comprising a second designated public key and a corresponding second designated private key, wherein the second designated private key also corresponds to a second designated public address associated with the underlying digital asset, and wherein the second designated private key is stored on a second computer system which is physically separated from the first computer system and is not operatively or physically connected to the first peer-to-peer network; (c) providing first smart contract instructions for a stable value digital asset token associated with a first contract address associated with the underlying digital asset, wherein the smart contract instructions are saved as part of the first blockchain for the underlying digital asset and include: (1) token creation instructions including instructions to create tokens; (2) token transfer instructions including instructions to transfer tokens; (3) token destruction instructions including instructions to destroy tokens; (4) authorization instructions associated with the first designated key pair; and (5) authorization instructions associated with the second designated key pair; (d) receiving, by an administrator system, a request to obtain a first sum of stable value digital asset tokens in exchange for a second sum of currency, wherein the first sum corresponds to the second sum based on a fixed ratio of the stable value digital asset token to the currency, wherein the request comes from a first requesting user with an associated first requester key pair, comprising a first requester public key and a corresponding first requester private key, and wherein the first requester private key also corresponds to a first requester public address associated with the underlying digital asset; (e) confirming, by the administrator system, receipt of the second sum of currency; (f) transferring the first sum of stable value digital asset tokens to the first requester public address using the following steps: (1) sending a second request, from the administrator system to the first computer system, to obtain the first sum of stable value digital asset tokens and transfer said first sum to the first requester public address; (2) generating, by the first computer system, first instructions addressed from the first designated public address to the first contract address including a message to obtain the first sum of stable value digital asset tokens and to assign the obtained first sum to the first requester public address; (3) digitally signing, by the first computer system, the first instructions using the first designated private key to generate first digitally signed instructions; and (4) sending, from the first computer system to the first plurality of geographically distributed computer systems, the first digitally signed instructions, wherein the first digitally signed instructions are executed by the first plurality of geographically distributed computer systems in accordance with the first contract instructions; and (g) confirming, by the administrator system, that the first sum of stable value digital asset tokens has been obtained and transferred to the first requester public address based on reference to the first blockchain.

In embodiments, the method further comprises the steps of: (h) receiving, by the administrator system, a third request to obtain a third sum of stable value digital asset tokens in exchange for a fourth sum of the currency, wherein the third sum corresponds to the fourth sum based on the fixed ratio of the stable value digital asset token to the currency, wherein the third request comes from a second requesting user with an associated second requester key pair, comprising a second requester public key and a corresponding second requester private key, and wherein the second requester private key is associated with a second requester public address associated with the underlying digital asset; (i) confirming, by the administrator system, receipt of the fourth sum of the second digital asset; (j) transferring the third sum of stable value digital asset tokens to the second requester public address using the following steps: (1) generating, by the administrator system, second instructions from the second designated public address to the first contract address to obtain the third sum of stable value digital asset tokens and transfer said third sum to the second requester public address; (2) transferring, from the administrator system to a first portable memory device, the second instructions; (3) transferring, from the first portable memory device to the second computer, the second instructions; (4) digitally signing, by the second computer, the second instructions using the second designated private key to generate second digitally signed instructions; (5) transferring, from the second computer to a second portable memory device, the second digitally signed instructions; and (6) sending, from the second portable memory device to the first plurality of geographically distributed computer systems, the second digitally signed instructions; and (k) confirming, by the administrator system, that the third sum of stable value digital asset tokens have been obtained and transferred to the second requester public address based on reference to the first blockchain.

In embodiments, the step of (j)(6) includes steps of: (i) transferring, from the second portable memory device to the administrator system, the second digitally signed instructions; and (ii) transferring, from the administrator system to the plurality of geographically distributed computer systems, the second digitally signed instructions.

In embodiments, the method further comprises the steps of: (1) providing a third designated key pair comprising a third designated public key and a corresponding third designated private key, wherein the third designated private key is stored on a third computer system which is physically separated from the first computer system and the second computer system and wherein the third computer system is not operatively connected or physically connected to the peer-to-peer network; wherein the first smart contract instructions further include: (6) authorization instructions associated with the third designated key pair; and wherein, with respect to step (j), performing the following further steps: (7) determining that the first designated key pair does not have authority to obtain the third sum of stable value digital asset tokens; (8) determining, by the administrator system, the third designated key pair and the second designated key pair together have authority to obtain the third sum; (9) generating, by the administrator system, third instructions from the third designated public address to the first contract address to obtain the third sum of stable value digital asset tokens and transfer said third sum to the second requester public address; (10) transferring, from the administrator system to a third portable memory device, the third instructions; (11) transferring, from the third portable memory device to the third computer system, the third instructions; (12) digitally signing, by the third computer system, the third instructions using the third designated private key to generate third digitally signed instructions; (13) transferring, from the third computer system to a fourth portable memory device, the third digitally signed instructions; and (14) sending, from the fourth portable memory device to the first plurality of geographically distributed computer systems, the third digitally signed instructions.

In embodiments, step (j)(14) includes the steps of: (A) transferring, from the fourth portable memory device to the administrator system, the third digitally signed instructions; and (B) transferring, from the administrator system to the plurality of geographically distributed computer systems, the third digitally signed instructions.

In embodiments, the third portable memory device and fourth portable memory device are the same portable memory device.

In embodiments, the third portable memory device and fourth portable memory device are different portable memory devices.

In embodiments, the first portable memory device and second portable memory device are the same portable memory device.

In embodiments, the first portable memory device and second portable memory device are different portable memory devices.

In embodiments, the method further includes the steps of: (1) providing a third designated key pair comprising a third designated public key and a corresponding third designated private key, wherein the third designated private key is stored on a third computer system which is physically separated from the first computer system and the second computer system and wherein the third computer system is not operatively connected or physically connected to the first peer-to-peer network; and wherein the first smart contract instructions further include: (6) authorization instructions associated with the third key pair; and wherein with respect to step (j), performing the following further steps: (7) determining the first designated key pair does not have authority to obtain the third sum; (8) determining the first designated key pair does not have authority to obtain the third sum; (9) determining, by the administrator system, that the third designated key pair, the second designated key pair and the first designated key pair together have authority to obtain the third sum; (10) sending a fifth request, from the administrator system to the first computer system, to obtain the third sum of stable value digital asset tokens and transfer said third sum to the second requester public address; (11) generating, by the administrator system, third instructions from the third designated public address to the first contract address to obtain the third sum of stable value digital asset tokens and transfer said third sum to the second requester public address; (12) transferring, from the administrator system to a third portable memory device, the third instructions; (13) transferring, from the third portable memory device to the third computer system, the third instructions; (14) digitally signing, by the third computer system, the third instructions using the third designated private key to generate third digitally signed instructions; (15) transferring, from the third computer system to a fourth portable memory device, the third digitally signed instructions; and (16) sending, from the fourth portable memory device to the first plurality of geographically distributed computer systems, the third digitally signed instructions.

In embodiments, the step (j)(16) includes the steps of: (A) transferring, from the fourth portable memory device to the administrator system, the third digitally signed instructions; and (B) transferring, from the administrator system to the plurality of geographically distributed computer systems, the third digitally signed instructions.

In embodiments, the fourth sum of the stable vale digital asset token is used by the administrator to purchase one or more interest bearing financial instruments.

In embodiments, the method further includes the steps of: (1) generating, by a first requester computing device associated with the first requester, a transfer message to transfer stable value digital asset tokens to the second requester public address, the transfer message including: (1) a transfer number of stable value digital asset tokens; (2) the first requester public address; (3) the second requester public address; and (4) an electronic signature based on the first requester private key; (m) publishing, by the first requester computing device to the to the first plurality of geographically distributed computer systems, the transfer message; and (n) confirming, by the first requester computing device, the transfer of the transfer number of stable value digital asset tokens from the first requester public address to the second requester public address by reference to the first blockchain.

In embodiments, the authorization instructions associated with the first designated key pair include a limit on a number of tokens the first designated key pair is authorized to issue.

In embodiments, the authorization instructions associated with the first designated key pair include a time limit during which the first designated key pair is authorized to issue tokens.

In embodiments, the authorization instructions associated with the first designated key pair include a limit on a number of tokens the first designated key pair is authorized to issue over a period of time.

In embodiments, the currency is fiat currency.

In embodiments, the fiat currency is U.S. Dollar.

In embodiments, the fixed ratio is one stable value digital asset token for 1 U.S. dollar.

In embodiments, the fixed ratio is 100 stable value digital asset tokens for one U.S. dollar.

In embodiments, the fiat currency is GB pound.

In embodiments, the fiat currency is SG dollar.

In embodiments, the fiat currency is EUR.

In embodiments, the fiat currency is HK dollar.

In embodiments, the fiat currency is Canadian dollar.

In embodiments, the fiat currency is Australian dollar.

In embodiments, the fiat currency is Yen.

In embodiments, the fourth sum of the currency is deposited in one or more bank accounts associated with the administrator.

In embodiments, the method further includes the steps of: (l) providing, by the administrator system a ledger including first account information associated with at least the first requesting user and second account information associated with at least the second requesting user, wherein the first account information includes first stable value digital asset token balance information and the second account information includes second stable value digital asset token balance information; (m) determining, by the administrator system, a total balance of the stable value digital asset tokens based on the sum of the first stable value digital asset token balance information and the second stable value digital asset token balance information; and (n) publishing, by the administrator system, the total balance of stable value digital asset tokens.

In embodiments, the currency is a cryptocurrency.

In embodiments, the cryptocurrency is Bitcoin.

In embodiments, the cryptocurrency is Litecoin.

In embodiments, the cryptocurrency is Bitcoin Cash.

In embodiments, the cryptocurrency is Filecoin.

In embodiments, the cryptocurrency is Zcash.

In embodiments, the cryptocurrency is Stellar.

In embodiments, the cryptocurrency is Polkadot.

In embodiments, the cryptocurrency is Atom.

In embodiments, the cryptocurrency is Tezos.

In embodiments, the first blockchain is an Ethereum blockchain.

In embodiments, the first blockchain is a Neo blockchain.

In embodiments, the first designated public key is mathematically associated with the first designated private key.

In embodiments, the second designated public key is mathematically associated with the second designated private key.

In embodiments, the first contract instructions are based on the ERC720 standard.

In embodiments, the first request to obtain the first sum of stable value digital asset tokens specifies a requester fee payable to the administrator system in addition to the second sum of the second digital asset and step (e) includes confirming, by the administrator system, receipt of the second sum of the second digital asset and the requester fee.

In embodiments, the first request to obtain the first sum of stable value digital asset tokens specifies a miner fee payable to miners associated with the first plurality of geographically distributed computer systems and step (e) includes confirming, by the administrator system, receipt of the second sum of the second digital asset and the miner fee.

In embodiments, a method of obtaining stable value digital asset tokens may comprise the steps of: (a) providing a first designated key pair comprising a first designated public key and a corresponding first designated private key, wherein the first designated private key also corresponds to a first designated public address associated with an underlying digital asset, wherein the underlying digital asset is maintained on a distributed public transaction ledger by a first plurality of geographically distributed computer systems in a first peer-to-peer network in the form of a first blockchain, and wherein the first designated private key is stored on a first computer system which is connected via the Internet to the first peer-to-peer network; (b) providing a second designated key pair comprising a second designated public key and a corresponding second designated private key, wherein the second designated private key also corresponds to a second designated public address associated with the underlying digital asset, and wherein the second designated private key is stored on a second computer system which is physically separated from the first computer system and is not operatively or physically connected to the first peer-to-peer network; (c) providing first smart contract instructions for a stable value digital asset token associated with a first contract address associated with the underlying digital asset, wherein the smart contract instructions are saved as part of the first blockchain for the underlying digital asset and include: (1) token creation instructions including instructions to create tokens; (2) token transfer instructions including instructions to transfer tokens; (3) token destruction instructions including instructions to destroy tokens; (4) authorization instructions associated with the first designated key pair; and (5) authorization instructions associated with the second designated key pair; (d) receiving, by a digital asset exchange system, a request to obtain a first sum of stable value digital asset tokens in exchange for a second sum of currency, wherein the first sum corresponds to the second sum based on a fixed ratio of the stable value digital asset token to the currency, wherein the request comes from a first requesting user with an associated first requester key pair, comprising a first requester public key and a corresponding first requester private key, and wherein the first requester private key also corresponds to a first requester public address associated with the underlying digital asset; (e) confirming, by the digital asset exchange system, receipt of the second sum of currency; (f) transferring the first sum of stable value digital asset tokens to the first requester public address using the following steps: (1) sending a second request, from the digital asset exchange system to the first computer system, to obtain the first sum of stable value digital asset tokens and transfer said first sum to the first requester public address; (2) generating, by the first computer system, first instructions addressed from the first designated public address to the first contract address including a message to obtain the first sum of stable value digital asset tokens and to assign the obtained first sum to the first requester public address; (3) digitally signing, by the first computer system, the first instructions using the first designated private key to generate first digitally signed instructions; and (4) sending, from the first computer system to the first plurality of geographically distributed computer systems, the first digitally signed instructions, wherein the first digitally signed instructions are executed by the first plurality of geographically distributed computer systems in accordance with the first contract instructions; and (g) confirming, by the digital asset exchange system, that the first sum of stable value digital asset tokens has been obtained and transferred to the first requester public address based on reference to the first blockchain.

In embodiments, the method further comprises the steps of: (h) receiving, by the digital asset exchange system, a third request to obtain a third sum of stable value digital asset tokens in exchange for a fourth sum of the currency, wherein the third sum corresponds to the fourth sum based on the fixed ratio of the stable value digital asset token to the currency, wherein the third request comes from a second requesting user with an associated second requester key pair, comprising a second requester public key and a corresponding second requester private key, and wherein the second requester private key is associated with a second requester public address associated with the underlying digital asset; (i) confirming, by the digital asset exchange system, receipt of the fourth sum of the second digital asset; (j) transferring the third sum of stable value digital asset tokens to the second requester public address using the following steps: (1) generating, by the digital asset exchange system, second instructions from the second designated public address to the first contract address to obtain the third sum of stable value digital asset tokens and transfer said third sum to the second requester public address; (2) transferring, from the digital asset exchange system to a first portable memory device, the second instructions; (3) transferring, from the first portable memory device to the second computer, the second instructions; (4) digitally signing, by the second computer, the second instructions using the second designated private key to generate second digitally signed instructions; (5) transferring, from the second computer to a second portable memory device, the second digitally signed instructions; and (6) sending, from the second portable memory device to the first plurality of geographically distributed computer systems, the second digitally signed instructions; and (k) confirming, by the digital asset exchange system, that the third sum of stable value digital asset tokens have been obtained and transferred to the second requester public address based on reference to the first blockchain.

In embodiments, the step of (j)(6) includes steps of: (i) transferring, from the second portable memory device to the digital asset exchange system, the second digitally signed instructions; and (ii) transferring, from the digital asset exchange system to the plurality of geographically distributed computer systems, the second digitally signed instructions.

In embodiments, the method further comprises the steps of: (1) providing a third designated key pair comprising a third designated public key and a corresponding third designated private key, wherein the third designated private key is stored on a third computer system which is physically separated from the first computer system and the second computer system and wherein the third computer system is not operatively connected or physically connected to the peer-to-peer network; wherein the first smart contract instructions further include: (6) authorization instructions associated with the third designated key pair; and wherein, with respect to step (j), performing the following further steps: (7) determining that the first designated key pair does not have authority to obtain the third sum of stable value digital asset tokens; (8) determining, by the digital asset exchange system, the third designated key pair and the second designated key pair together have authority to obtain the third sum; (9) generating, by the digital asset exchange system, third instructions from the third designated public address to the first contract address to obtain the third sum of stable value digital asset tokens and transfer said third sum to the second requester public address; (10) transferring, from the digital asset exchange system to a third portable memory device, the third instructions; (11) transferring, from the third portable memory device to the third computer system, the third instructions; (12) digitally signing, by the third computer system, the third instructions using the third designated private key to generate third digitally signed instructions; (13) transferring, from the third computer system to a fourth portable memory device, the third digitally signed instructions; and (14) sending, from the fourth portable memory device to the first plurality of geographically distributed computer systems, the third digitally signed instructions.

In embodiments, step (j)(14) includes the steps of: (A) transferring, from the fourth portable memory device to the digital asset exchange system, the third digitally signed instructions; and (B) transferring, from the digital asset exchange system to the plurality of geographically distributed computer systems, the third digitally signed instructions.

In embodiments, the third portable memory device and fourth portable memory device are the same portable memory device.

In embodiments, the third portable memory device and fourth portable memory device are different portable memory devices.

In embodiments, the first portable memory device and second portable memory device are the same portable memory device.

In embodiments, the first portable memory device and second portable memory device are different portable memory devices.

In embodiments, the method further includes the steps of: (1) providing a third designated key pair comprising a third designated public key and a corresponding third designated private key, wherein the third designated private key is stored on a third computer system which is physically separated from the first computer system and the second computer system and wherein the third computer system is not operatively connected or physically connected to the first peer-to-peer network; and wherein the first smart contract instructions further include: (6) authorization instructions associated with the third key pair; and wherein with respect to step (j), performing the following further steps: (7) determining the first designated key pair does not have authority to obtain the third sum; (8) determining the first designated key pair does not have authority to obtain the third sum; (9) determining, by the digital asset exchange system, that the third designated key pair, the second designated key pair and the first designated key pair together have authority to obtain the third sum; (10) sending a fifth request, from the digital asset exchange system to the first computer system, to obtain the third sum of stable value digital asset tokens and transfer said third sum to the second requester public address; (11) generating, by the digital asset exchange system, third instructions from the third designated public address to the first contract address to obtain the third sum of stable value digital asset tokens and transfer said third sum to the second requester public address; (12) transferring, from the digital asset exchange system to a third portable memory device, the third instructions; (13)

transferring, from the third portable memory device to the third computer system, the third instructions; (14) digitally signing, by the third computer system, the third instructions using the third designated private key to generate third digitally signed instructions; (15) transferring, from the third computer system to a fourth portable memory device, the third digitally signed instructions; and (16) sending, from the fourth portable memory device to the first plurality of geographically distributed computer systems, the third digitally signed instructions.

In embodiments, the step (j)(16) includes the steps of: (A) transferring, from the fourth portable memory device to the digital asset exchange system, the third digitally signed instructions; and (B) transferring, from the digital asset exchange system to the plurality of geographically distributed computer systems, the third digitally signed instructions.

In embodiments, the fourth sum of the stable vale digital asset token is used by the digital asset exchange to purchase one or more interest bearing financial instruments.

In embodiments, the method further includes the steps of: (1) generating, by a first requester computing device associated with the first requester, a transfer message to transfer stable value digital asset tokens to the second requester public address, the transfer message including: (1) a transfer number of stable value digital asset tokens; (2) the first requester public address; (3) the second requester public address; and (4) an electronic signature based on the first requester private key; (m) publishing, by the first requester computing device to the to the first plurality of geographically distributed computer systems, the transfer message; and (n) confirming, by the first requester computing device, the transfer of the transfer number of stable value digital asset tokens from the first requester public address to the second requester public address by reference to the first blockchain.

In embodiments, the authorization instructions associated with the first designated key pair include a limit on a number of tokens the first designated key pair is authorized to issue.

In embodiments, the authorization instructions associated with the first designated key pair include a time limit during which the first designated key pair is authorized to issue tokens.

In embodiments, the authorization instructions associated with the first designated key pair include a limit on a number of tokens the first designated key pair is authorized to issue over a period of time.

In embodiments, the currency is fiat currency.

In embodiments, the fiat currency is U.S. Dollar.

In embodiments, the fixed ratio is one stable value digital asset token for 1 U.S. dollar.

In embodiments, the fixed ratio is 100 stable value digital asset tokens for one U.S. dollar.

In embodiments, the fiat currency is GB pound.

In embodiments, the fiat currency is SG dollar.

In embodiments, the fiat currency is EUR.

In embodiments, the fiat currency is HK dollar.

In embodiments, the fiat currency is Canadian dollar.

In embodiments, the fiat currency is Australian dollar.

In embodiments, the fiat currency is Yen.

In embodiments, the fourth sum of the currency is deposited in one or more bank accounts associated with the digital asset exchange.

In embodiments, the method further includes the steps of: (1) providing, by the digital asset exchange system a ledger including first account information associated with at least the first requesting user and second account information associated with at least the second requesting user, wherein the first account information includes first stable value digital asset token balance information and the second account information includes second stable value digital asset token balance information; (m) determining, by the digital asset exchange system, a total balance of the stable value digital asset tokens based on the sum of the first stable value digital asset token balance information and the second stable value digital asset token balance information; and (n) publishing, by the digital asset exchange system, the total balance of stable value digital asset tokens.

In embodiments, the currency is a cryptocurrency.

In embodiments, the cryptocurrency is Bitcoin.

In embodiments, the cryptocurrency is Litecoin.

In embodiments, the cryptocurrency is Bitcoin Cash.

In embodiments, the cryptocurrency is Filecoin.

In embodiments, the cryptocurrency is Zcash.

In embodiments, the cryptocurrency is Stellar.

In embodiments, the cryptocurrency is Polkadot.

In embodiments, the cryptocurrency is Atom.

In embodiments, the cryptocurrency is Tezos.

In embodiments, the first blockchain is an Ethereum blockchain.

In embodiments, the first blockchain is a Neo blockchain.

In embodiments, the first designated public key is mathematically associated with the first designated private key.

In embodiments, the second designated public key is mathematically associated with the second designated private key.

In embodiments, the first contract instructions are based on the ERC720 standard.

In embodiments, the first request to obtain the first sum of stable value digital asset tokens specifies a requester fee payable to the digital asset exchange system in addition to the second sum of the second digital asset and step (e) includes confirming, by the digital asset exchange system, receipt of the second sum of the second digital asset and the requester fee.

In embodiments, the first request to obtain the first sum of stable value digital asset tokens specifies a miner fee payable to miners associated with the first plurality of geographically distributed computer systems and step (e) includes confirming, by the digital asset exchange system, receipt of the second sum of the second digital asset and the miner fee.

In embodiments, a method of obtaining stable value digital asset tokens may comprise the steps of: (a) providing a first designated key pair comprising a first designated public key and a corresponding first designated private key, wherein the first designated private key also corresponds to a first designated public address associated with an underlying digital asset, wherein the underlying digital asset is maintained on a distributed public transaction ledger by a first plurality of geographically distributed computer systems in a first peer-to-peer network in the form of a first blockchain, and wherein the first designated private key is stored on a first computer system which is connected via the Internet to the first peer-to-peer network; (b) providing a second designated key pair comprising a second designated public key and a corresponding second designated private key, wherein the second designated private key also corresponds to a second designated public address associated with the underlying digital asset, and wherein the second designated private key is stored on a second computer system which is physically separated from the first computer system and is not operatively or physically connected to the first peer-to-peer network; (c) providing first smart contract instructions for a stable value digital asset token associated with a first contract address associated with the underlying digital asset, wherein the smart contract instructions are saved as part of the first blockchain for the underlying digital asset and include: (1) token creation instructions including instructions to create tokens; (2) token transfer instructions including instructions to transfer tokens; (3) token destruction instructions including instructions to destroy tokens; (4) authorization instructions associated with the first designated key pair; and (5) authorization instructions associated with the second designated key pair; (d) receiving, by a digital asset token issuer system, a request to obtain a first sum of stable value digital asset tokens in exchange for a second sum of currency, wherein the first sum corresponds to the second sum based on a fixed ratio of the stable value digital asset token to the currency, wherein the request comes from a first requesting user with an associated first requester key pair, comprising a first requester public key and a corresponding first requester private key, and wherein the first requester private key also corresponds to a first requester public address associated with the underlying digital asset; (e) confirming, by the digital asset token issuer system, receipt of the second sum of currency; (f) transferring the first sum of stable value digital asset tokens to the first requester public address using the following steps: (1) sending a second request, from the digital asset token issuer system to the first computer system, to obtain the first sum of stable value digital asset tokens and transfer said first sum to the first requester public address; (2) generating, by the first computer system, first instructions addressed from the first designated public address to the first contract address including a message to obtain the first sum of stable value digital asset tokens and to assign the obtained first sum to the first requester public address; (3) digitally signing, by the first computer system, the first instructions using the first designated private key to generate first digitally signed instructions; and (4) sending, from the first computer system to the first plurality of geographically distributed computer systems, the first digitally signed instructions, wherein the first digitally signed instructions are executed by the first plurality of geographically distributed computer systems in accordance with the first contract instructions; and (g) confirming, by the digital asset token issuer system, that the first sum of stable value digital asset tokens has been obtained and transferred to the first requester public address based on reference to the first blockchain.

In embodiments, the method further comprises the steps of: (h) receiving, by the digital asset token issuer system, a third request to obtain a third sum of stable value digital asset tokens in exchange for a fourth sum of the currency, wherein the third sum corresponds to the fourth sum based on the fixed ratio of the stable value digital asset token to the currency, wherein the third request comes from a second requesting user with an associated second requester key pair, comprising a second requester public key and a corresponding second requester private key, and wherein the second requester private key is associated with a second requester public address associated with the underlying digital asset; (i) confirming, by the digital asset token issuer system, receipt of the fourth sum of the second digital asset; (j) transferring the third sum of stable value digital asset tokens to the second requester public address using the following steps: (1) generating, by the digital asset token issuer system, second instructions from the second designated public address to the first contract address to obtain the third sum of stable value digital asset tokens and transfer said third sum to the second requester public address; (2) transferring, from the digital asset token issuer system to a first portable memory device, the second instructions; (3) transferring, from the first portable memory device to the second computer, the second instructions; (4) digitally signing, by the second computer, the second instructions using the second designated private key to generate second digitally signed instructions; (5) transferring, from the second computer to a second portable memory device, the second digitally signed instructions; and (6) sending, from the second portable memory device to the first plurality of geographically distributed computer systems, the second digitally signed instructions; and (k) confirming, by the digital asset token issuer system, that the third sum of stable value digital asset tokens have been obtained and transferred to the second requester public address based on reference to the first blockchain.

In embodiments, the step of (j)(6) includes steps of: (i) transferring, from the second portable memory device to the digital asset token issuer system, the second digitally signed instructions; and (ii) transferring, from the digital asset token issuer system to the plurality of geographically distributed computer systems, the second digitally signed instructions.

In embodiments, the method further comprises the steps of: (1) providing a third designated key pair comprising a third designated public key and a corresponding third designated private key, wherein the third designated private key is stored on a third computer system which is physically separated from the first computer system and the second computer system and wherein the third computer system is not operatively connected or physically connected to the peer-to-peer network; wherein the first smart contract instructions further include: (6) authorization instructions associated with the third designated key pair; and wherein, with respect to step (j), performing the following further steps: (7) determining that the first designated key pair does not have authority to obtain the third sum of stable value digital asset tokens; (8) determining, by the digital asset token issuer system, the third designated key pair and the second designated key pair together have authority to obtain the third sum; (9) generating, by the digital asset token issuer system, third instructions from the third designated public address to the first contract address to obtain the third sum of stable value digital asset tokens and transfer said third sum to the second requester public address; (10) transferring, from the digital asset token issuer system to a third portable memory device, the third instructions; (11) transferring, from the third portable memory device to the third computer system, the third instructions; (12) digitally signing, by the third computer system, the third instructions using the third designated private key to generate third digitally signed instructions; (13) transferring, from the third computer system to a fourth portable memory device, the third digitally signed instructions; and (14) sending, from the fourth portable memory device to the first plurality of geographically distributed computer systems, the third digitally signed instructions.

In embodiments, step (j)(14) includes the steps of: (A) transferring, from the fourth portable memory device to the digital asset token issuer system, the third digitally signed instructions; and (B) transferring, from the digital asset token issuer system to the plurality of geographically distributed computer systems, the third digitally signed instructions.

In embodiments, the third portable memory device and fourth portable memory device are the same portable memory device.

In embodiments, the third portable memory device and fourth portable memory device are different portable memory devices.

In embodiments, the first portable memory device and second portable memory device are the same portable memory device.

In embodiments, the first portable memory device and second portable memory device are different portable memory devices.

In embodiments, the method further includes the steps of: (1) providing a third designated key pair comprising a third designated public key and a corresponding third designated private key, wherein the third designated private key is stored on a third computer system which is physically separated from the first computer system and the second computer system and wherein the third computer system is not operatively connected or physically connected to the first peer-to-peer network; and wherein the first smart contract instructions further include: (6) authorization instructions associated with the third key pair; and wherein with respect to step (j), performing the following further steps: (7) determining the first designated key pair does not have authority to obtain the third sum; (8) determining the first designated key pair does not have authority to obtain the third sum; (9) determining, by the digital asset token issuer system, that the third designated key pair, the second designated key pair and the first designated key pair together have authority to obtain the third sum; (10) sending a fifth request, from the digital asset token issuer system to the first computer system, to obtain the third sum of stable value digital asset tokens and transfer said third sum to the second requester public address; (11) generating, by the digital asset token issuer system, third instructions from the third designated public address to the first contract address to obtain the third sum of stable value digital asset tokens and transfer said third sum to the second requester public address; (12) transferring, from the digital asset token issuer system to a third portable memory device, the third instructions; (13) transferring, from the third portable memory device to the third computer system, the third instructions; (14) digitally signing, by the third computer system, the third instructions using the third designated private key to generate third digitally signed instructions; (15) transferring, from the third computer system to a fourth portable memory device, the third digitally signed instructions; and (16) sending, from the fourth portable memory device to the first plurality of geographically distributed computer systems, the third digitally signed instructions.

In embodiments, the step (j)(16) includes the steps of: (A) transferring, from the fourth portable memory device to the digital asset token issuer system, the third digitally signed instructions; and (B) transferring, from the digital asset token issuer system to the plurality of geographically distributed computer systems, the third digitally signed instructions.

In embodiments, the fourth sum of the stable vale digital asset token is used by the digital asset token issuer to purchase one or more interest bearing financial instruments.

In embodiments, the method further includes the steps of: (1) generating, by a first requester computing device associated with the first requester, a transfer message to transfer stable value digital asset tokens to the second requester public address, the transfer message including: (1) a transfer number of stable value digital asset tokens; (2) the first requester public address; (3) the second requester public address; and (4) an electronic signature based on the first requester private key; (m) publishing, by the first requester computing device to the to the first plurality of geographically distributed computer systems, the transfer message; and (n) confirming, by the first requester computing device, the transfer of the transfer number of stable value digital asset tokens from the first requester public address to the second requester public address by reference to the first blockchain.

In embodiments, the authorization instructions associated with the first designated key pair include a limit on a number of tokens the first designated key pair is authorized to issue.

In embodiments, the authorization instructions associated with the first designated key pair include a time limit during which the first designated key pair is authorized to issue tokens.

In embodiments, the authorization instructions associated with the first designated key pair include a limit on a number of tokens the first designated key pair is authorized to issue over a period of time.

In embodiments, the currency is fiat currency.

In embodiments, the fiat currency is U.S. Dollar.

In embodiments, the fixed ratio is one stable value digital asset token for 1 U.S. dollar.

In embodiments, the fixed ratio is 100 stable value digital asset tokens for one U.S. dollar.

In embodiments, the fiat currency is GB pound.

In embodiments, the fiat currency is SG dollar.

In embodiments, the fiat currency is EUR.

In embodiments, the fiat currency is HK dollar.

In embodiments, the fiat currency is Canadian dollar.

In embodiments, the fiat currency is Australian dollar.

In embodiments, the fiat currency is Yen.

In embodiments, the fourth sum of the currency is deposited in one or more bank accounts associated with the digital asset token issuer.

In embodiments, the method further includes the steps of: (1) providing, by the digital asset token issuer system a ledger including first account information associated with at least the first requesting user and second account information associated with at least the second requesting user, wherein the first account information includes first stable value digital asset token balance information and the second account information includes second stable value digital asset token balance information; (m) determining, by the digital asset token issuer system, a total balance of the stable value digital asset tokens based on the sum of the first stable value digital asset token balance information and the second stable value digital asset token balance information; and (n) publishing, by the digital asset token issuer system, the total balance of stable value digital asset tokens.

In embodiments, the currency is a cryptocurrency.

In embodiments, the cryptocurrency is Bitcoin.

In embodiments, the cryptocurrency is Litecoin.

In embodiments, the cryptocurrency is Bitcoin Cash.

In embodiments, the cryptocurrency is Filecoin.

In embodiments, the cryptocurrency is Zcash.

In embodiments, the cryptocurrency is Stellar.

In embodiments, the cryptocurrency is Polkadot.

In embodiments, the cryptocurrency is Atom.

In embodiments, the cryptocurrency is Tezos.

In embodiments, the first blockchain is an Ethereum blockchain.

In embodiments, the first blockchain is a Neo blockchain.

In embodiments, the first designated public key is mathematically associated with the first designated private key.

In embodiments, the second designated public key is mathematically associated with the second designated private key.

In embodiments, the first contract instructions are based on the ERC720 standard.

In embodiments, the first request to obtain the first sum of stable value digital asset tokens specifies a requester fee payable to the digital asset token issuer system in addition to the second sum of the second digital asset and step (e) includes confirming, by the digital asset token issuer system, receipt of the second sum of the second digital asset and the requester fee.

In embodiments, the first request to obtain the first sum of stable value digital asset tokens specifies a miner fee payable to miners associated with the first plurality of geographically distributed computer systems and step (e) includes confirming, by the digital asset token issuer system, receipt of the second sum of the second digital asset and the miner fee.

In embodiments, a method of issuing electronic payments using an amount of stable value digital asset tokens may comprise the steps of: (a) providing a digital asset first token database stored on a first set of one or more computer readable media associated with a digital asset first token issuer system associated with a digital asset first token issuer, wherein the digital asset first token database comprising a log of digital asset first tokens including: (i) a first set of digital asset addresses, each respective digital asset address of the first set of digital asset addresses tied to a distributed transaction ledger maintained by a plurality of geographically distributed computer systems in a peer-to-peer network in the form of a blockchain, the first set of digital asset addresses including a first respective digital asset address for each respective digital asset first token holder; and (ii) a respective digital asset first token amount associated with each respective first digital asset address; (b) providing a stable value digital asset token database stored on the distributed transaction ledger maintained by the plurality of geographically distributed computer systems in the peer-to-peer network, the stable value digital asset token database comprising a log of stable value digital asset token including: (i) a second set of digital asset addresses, each respective digital asset address of the second set of digital asset addresses tied to the distributed transaction ledger maintained by the plurality of geographically distributed computer systems in the peer-to-peer network, the second set of digital asset addresses including a second respective digital asset address for each respective stable value digital asset token holder; and (ii) a respective stable value digital asset token amount for each second respective stable value digital asset token address associated with a respective stable value digital asset token holder, wherein the stable value digital asset token stable value digital asset tokens are issued by a stable value administrator; (c)obtaining, by an administrator system associated with an administrator, a first sum of stable value digital asset tokens in a first designated public address associated with the blockchain, wherein the first sum of stable value digital asset tokens are backed by a second amount of a second digital asset based on a fixed ratio of the stable value digital asset token to the second digital asset, wherein the second digital asset is maintained on a second distributed public transaction ledger maintained by a second plurality of geographically distributed computer systems in a second peer-to-peer network in the form of a second blockchain, and wherein the first designated public address corresponds to a first designated public key and a corresponding first designated private key; (d) accessing, by the administrator system, the digital asset first token database to determine: (i) each respective digital asset address of the first set of digital asset addresses for each respective digital asset first token holder; and (ii) the respective digital asset first token amount associated with each respective digital asset address; (e) determining a respective payment amount in stable value digital asset tokens to be made to each respective digital asset address of the first set of digital asset addresses based at least in part on the first sum of stable value digital asset tokens and the respective digital asset first token amount associated with each respective digital asset address of the first set of digital asset addresses; (f) generating, by the administrator system, transaction instructions to transfer the respective payment amount of stable value digital asset tokens from the designated public address to each respective digital asset address of the first set of digital asset addresses with a digital signature based on the first designated private key; (g) publishing, by the administrator system to the blockchain, the transaction instructions, wherein the plurality of geographically distributed computer systems implement the transaction instructions to transfer the respective payment amount of stable value digital asset tokens to each respective digital asset address of the first set of digital asset addresses, where ownership of each digital asset first token remains the same; and (h) confirming, by the administrator system, that each digital asset address of the first set of the digital asset addresses received the determined respective payment amount in stable value digital asset tokens based on reference to the blockchain.

In embodiments, the second digital asset is Bitcoin.

In embodiments, the second digital asset is Bitcoin Cash.

In embodiments, the second digital asset is Stellar.

In embodiments, the second digital asset is Filecoin.

In embodiments, the second digital asset is Litecoin.

In embodiments, the second digital asset is Tezos.

In embodiments, the second digital asset is Zcash.

In embodiments, the second digital asset is Polkadot.

In embodiments, the second digital asset is Atom.

In embodiments, the blockchain is an Ethereum blockchain.

In embodiments, the blockchain is a Neo blockchain.

In embodiments, the method may further comprise: (i) notifying, by the administrator system, each digital asset address of the first set of the digital asset addresses of each respective transfer of stable value digital asset tokens to each respective digital asset address of the first set of digital asset addresses.

In embodiments, the digital asset first token is a security registered with a government authority.

In embodiments, the digital asset first token is a debt security and the electronic payments are interest.

In embodiments, the digital asset first token is an equity security and the electronic payments are dividends.

In embodiments, the digital asset first token is secured by intellectual property rights and the electronic payments are royalties.

In embodiments, the peer-to-peer network is based on a mathematical protocol for proof of work.

In embodiments, the peer-to-peer network is based on a mathematical protocol for proof of stake.

In embodiments, the peer-to-peer network is based on a cryptographic mathematical protocol.

In embodiments, the method may further comprise an additional step of publishing, by the administrator system to a side ledger, the transaction instructions associated with crediting the respective payment amount of stable value digital asset tokens to each respective digital asset address of the first set of digital asset addresses, and wherein the publishing step (g) includes publishing the transaction instructions from the side ledger to the distributed asset ledger periodically or aperiodically.

In embodiments, the method may further comprise steps of: (i) receiving, at the digital asset first token issuer system, from at least one digital asset first token holder, a payment request prior to the obtaining step (c), the payment request including: (1) the digital asset address of the digital asset first token holder; and (2) a request to transfer a payment amount of stable value digital asset tokens to the digital asset address of the digital asset first token holder; and (j) confirming, at the digital asset first token issuer system, that: (1) the digital asset address of the digital asset first token holder is valid; (2) the digital asset first token amount of digital asset first tokens associated with the address of the digital asset first token holder is more than zero; and (3) the digital asset first token holder is entitled to payment; and (k) generating, at the digital asset first token issuer system, the first request based at least in part on the payment request when the digital asset address of the at least one digital asset first token holder is valid, the digital asset first token amount of digital asset first tokens associated with the digital asset address of the at least one digital asset first token holder is more than zero and the at least one digital asset first token holder is entitled to payment.

In embodiments, the first set of one or more computer readable media associated with the digital asset first token issuer system is operably connected to a node of the plurality of geographically distributed computer systems in the peer-to-peer network in the form of the blockchain, wherein the node is maintained by the digital asset first token issuer.

In embodiments, the digital asset first token database is maintained and stored on the plurality of geographically distributed computer systems in the peer-to-peer network.

In embodiments, the digital asset first token database is maintained on a sidechain, separate from the peer-to-peer network, wherein information on the sidechain is published and stored on the peer-to-peer network periodically or aperiodically.

In embodiments, the generating step (f) includes generating, by the administrator system, transaction instructions for the first sum of stable value digital asset tokens by updating the stable value digital asset token database to reserve stable value digital asset tokens in the amount of the first sum.

In embodiments, the payment amount relates to a dividend to be paid based on ownership of each digital asset first token.

In embodiments, the payment amount relates to a royalty to be paid based on ownership of each digital asset first token.

In embodiments, the payment amount relates to interest to be paid based on ownership of each digital asset first token.

In embodiments, the peer-to-peer network uses a byzantine fault tolerance protocol as a consensus mechanism.

In embodiments, a method of issuing electronic payments using an amount of stable value digital asset tokens may comprise the steps of: (a) providing a digital asset first token database stored on a first set of one or more computer readable media associated with a digital asset first token issuer system associated with a digital asset first token issuer, wherein the digital asset first token database comprising a log of digital asset first tokens including: (i) a first set of digital asset addresses, each respective digital asset address of the first set of digital asset addresses tied to a distributed transaction ledger maintained by a plurality of geographically distributed computer systems in a peer-to-peer network in the form of a blockchain, the first set of digital asset addresses including a first respective digital asset address for each respective digital asset first token holder; and (ii) a respective digital asset first token amount associated with each respective first digital asset address; (b) providing a stable value digital asset token database stored on the distributed transaction ledger maintained by the plurality of geographically distributed computer systems in the peer-to-peer network, the stable value digital asset token database comprising a log of stable value digital asset token including: (i) a second set of digital asset addresses, each respective digital asset address of the second set of digital asset addresses tied to the distributed transaction ledger maintained by the plurality of geographically distributed computer systems in the peer-to-peer network, the second set of digital asset addresses including a second respective digital asset address for each respective stable value digital asset token holder; and (ii) a respective stable value digital asset token amount for each second respective stable value digital asset token address associated with a respective stable value digital asset token holder, wherein the stable value digital asset token stable value digital asset tokens are issued by a stable value digital asset exchange; (c) obtaining, by a digital asset exchange system associated with a digital asset exchange, a first sum of stable value digital asset tokens in a first designated public address associated with the blockchain, wherein the first sum of stable value digital asset tokens are backed by a second amount of a second digital asset based on a fixed ratio of the stable value digital asset token to the second digital asset, wherein the second digital asset is maintained on a second distributed public transaction ledger maintained by a second plurality of geographically distributed computer systems in a second peer-to-peer network in the form of a second blockchain, and wherein the first designated public address corresponds to a first designated public key and a corresponding first designated private key; (d) accessing, by the digital asset exchange system, the digital asset first token database to determine: (i) each respective digital asset address of the first set of digital asset addresses for each respective digital asset first token holder; and (ii) the respective digital asset first token amount associated with each respective digital asset address; (e) determining a respective payment amount in stable value digital asset tokens to be made to each respective digital asset address of the first set of digital asset addresses based at least in part on the first sum of stable value digital asset tokens and the respective digital asset first token amount associated with each respective digital asset address of the first set of digital asset addresses; (f) generating, by the digital asset exchange system, transaction instructions to transfer the respective payment amount of stable value digital asset tokens from the designated public address to each respective digital asset address of the first set of digital asset addresses with a digital signature based on the first designated private key; (g) publishing, by the digital asset exchange system to the blockchain, the transaction instructions, wherein the plurality of geographically distributed computer systems implement the transaction instructions to transfer the respective payment amount of stable value digital asset tokens to each respective digital asset address of the first set of digital asset addresses, where ownership of each digital asset first token remains the same; and (h) confirming, by the digital asset exchange system, that each digital asset address of the first set of the digital asset addresses received the determined respective payment amount in stable value digital asset tokens based on reference to the blockchain.

In embodiments, the second digital asset is Bitcoin.

In embodiments, the second digital asset is Bitcoin Cash.

In embodiments, the second digital asset is Stellar.

In embodiments, the second digital asset is Filecoin.

In embodiments, the second digital asset is Litecoin.

In embodiments, the second digital asset is Tezos.

In embodiments, the second digital asset is Zcash.

In embodiments, the second digital asset is Polkadot.

In embodiments, the second digital asset is Atom.

In embodiments, the blockchain is an Ethereum blockchain.

In embodiments, the blockchain is a Neo blockchain.

In embodiments, the method may further comprise: (i) notifying, by the digital asset exchange system, each digital asset address of the first set of the digital asset addresses of each respective transfer of stable value digital asset tokens to each respective digital asset address of the first set of digital asset addresses.

In embodiments, the digital asset first token is a security registered with a government authority.

In embodiments, the digital asset first token is a debt security and the electronic payments are interest.

In embodiments, the digital asset first token is an equity security and the electronic payments are dividends.

In embodiments, the digital asset first token is secured by intellectual property rights and the electronic payments are royalties.

In embodiments, the peer-to-peer network is based on a mathematical protocol for proof of work.

In embodiments, the peer-to-peer network is based on a mathematical protocol for proof of stake.

In embodiments, the peer-to-peer network is based on a cryptographic mathematical protocol.

In embodiments, the method may further comprise an additional step of publishing, by the digital asset exchange system to a side ledger, the transaction instructions associated with crediting the respective payment amount of stable value digital asset tokens to each respective digital asset address of the first set of digital asset addresses, and wherein the publishing step (g) includes publishing the transaction instructions from the side ledger to the distributed asset ledger periodically or aperiodically.

In embodiments, the method may further comprise steps of: (i) receiving, at the digital asset first token issuer system, from at least one digital asset first token holder, a payment request prior to the obtaining step (c), the payment request including: (3) the digital asset address of the digital asset first token holder; and (4) a request to transfer a payment amount of stable value digital asset tokens to the digital asset address of the digital asset first token holder; and (j) confirming, at the digital asset first token issuer system, that: (1) the digital asset address of the digital asset first token holder is valid; (2) the digital asset first token amount of digital asset first tokens associated with the address of the digital asset first token holder is more than zero; and (3) the digital asset first token holder is entitled to payment; and (k) generating, at the digital asset first token issuer system, the first request based at least in part on the payment request when the digital asset address of the at least one digital asset first token holder is valid, the digital asset first token amount of digital asset first tokens associated with the digital asset address of the at least one digital asset first token holder is more than zero and the at least one digital asset first token holder is entitled to payment.

In embodiments, the first set of one or more computer readable media associated with the digital asset first token issuer system is operably connected to a node of the plurality of geographically distributed computer systems in the peer-to-peer network in the form of the blockchain, wherein the node is maintained by the digital asset first token issuer.

In embodiments, the digital asset first token database is maintained and stored on the plurality of geographically distributed computer systems in the peer-to-peer network.

In embodiments, the digital asset first token database is maintained on a sidechain, separate from the peer-to-peer network, wherein information on the sidechain is published and stored on the peer-to-peer network periodically or aperiodically.

In embodiments, the generating step (f) includes generating, by the digital asset exchange system, transaction instructions for the first sum of stable value digital asset tokens by updating the stable value digital asset token database to reserve stable value digital asset tokens in the amount of the first sum.

In embodiments, the payment amount relates to a dividend to be paid based on ownership of each digital asset first token.

In embodiments, the payment amount relates to a royalty to be paid based on ownership of each digital asset first token.

In embodiments, the payment amount relates to interest to be paid based on ownership of each digital asset first token.

In embodiments, the peer-to-peer network uses a byzantine fault tolerance protocol as a consensus mechanism.

In embodiments, a method of issuing electronic payments using an amount of stable value digital asset tokens may comprise the steps of: (a) providing a digital asset first token database stored on a first set of one or more computer readable media associated with a digital asset first token issuer system associated with a digital asset first token issuer, wherein the digital asset first token database comprising a log of digital asset first tokens including: (i) a first set of digital asset addresses, each respective digital asset address of the first set of digital asset addresses tied to a distributed transaction ledger maintained by a plurality of geographically distributed computer systems in a peer-to-peer network in the form of a blockchain, the first set of digital asset addresses including a first respective digital asset address for each respective digital asset first token holder; and (ii) a respective digital asset first token amount associated with each respective first digital asset address; (b) providing a stable value digital asset token database stored on the distributed transaction ledger maintained by the plurality of geographically distributed computer systems in the peer-to-peer network, the stable value digital asset token database comprising a log of stable value digital asset token including: (i) a second set of digital asset addresses, each respective digital asset address of the second set of digital asset addresses tied to the distributed transaction ledger maintained by the plurality of geographically distributed computer systems in the peer-to-peer network, the second set of digital asset addresses including a second respective digital asset address for each respective stable value digital asset token holder; and (ii) a respective stable value digital asset token amount for each second respective stable value digital asset token address associated with a respective stable value digital asset token holder, wherein the stable value digital asset token stable value digital asset tokens are issued by a stable value digital asset token issuer; (c) obtaining, by a digital asset token issuer system associated with a digital asset token issuer, a first sum of stable value digital asset tokens in a first designated public address associated with the blockchain, wherein the first sum of stable value digital asset tokens are backed by a second amount of a second digital asset based on a fixed ratio of the stable value digital asset token to the second digital asset, wherein the second digital asset is maintained on a second distributed public transaction ledger maintained by a second plurality of geographically distributed computer systems in a second peer-to-peer network in the form of a second blockchain, and wherein the first designated public address corresponds to a first designated public key and a corresponding first designated private key; (d) accessing, by the digital asset token issuer system, the digital asset first token database to determine: (i) each respective digital asset address of the first set of digital asset addresses for each respective digital asset first token holder; and (ii) the respective digital asset first token amount associated with each respective digital asset address; (e) determining a respective payment amount in stable value digital asset tokens to be made to each respective digital asset address of the first set of digital asset addresses based at least in part on the first sum of stable value digital asset tokens and the respective digital asset first token amount associated with each respective digital asset address of the first set of digital asset addresses; (f) generating, by the digital asset token issuer system, transaction instructions to transfer the respective payment amount of stable value digital asset tokens from the designated public address to each respective digital asset address of the first set of digital asset addresses with a digital signature based on the first designated private key; (g) publishing, by the digital asset token issuer system to the blockchain, the transaction instructions, wherein the plurality of geographically distributed computer systems implement the transaction instructions to transfer the respective payment amount of stable value digital asset tokens to each respective digital asset address of the first set of digital asset addresses, where ownership of each digital asset first token remains the same; and (h) confirming, by the digital asset token issuer system, that each digital asset address of the first set of the digital asset addresses received the determined respective payment amount in stable value digital asset tokens based on reference to the blockchain.

In embodiments, the second digital asset is Bitcoin.

In embodiments, the second digital asset is Bitcoin Cash.

In embodiments, the second digital asset is Stellar.

In embodiments, the second digital asset is Filecoin.

In embodiments, the second digital asset is Litecoin.

In embodiments, the second digital asset is Tezos.

In embodiments, the second digital asset is Zcash.

In embodiments, the second digital asset is Polkadot.

In embodiments, the second digital asset is Atom.

In embodiments, the blockchain is an Ethereum blockchain.

In embodiments, the blockchain is a Neo blockchain.

In embodiments, the method may further comprise: (i) notifying, by the digital asset token issuer system, each digital asset address of the first set of the digital asset addresses of each respective transfer of stable value digital asset tokens to each respective digital asset address of the first set of digital asset addresses.

In embodiments, the digital asset first token is a security registered with a government authority.

In embodiments, the digital asset first token is a debt security and the electronic payments are interest.

In embodiments, the digital asset first token is an equity security and the electronic payments are dividends.

In embodiments, the digital asset first token is secured by intellectual property rights and the electronic payments are royalties.

In embodiments, the peer-to-peer network is based on a mathematical protocol for proof of work.

In embodiments, the peer-to-peer network is based on a mathematical protocol for proof of stake.

In embodiments, the peer-to-peer network is based on a cryptographic mathematical protocol.

In embodiments, the method may further comprise an additional step of publishing, by the digital asset token issuer system to a side ledger, the transaction instructions associated with crediting the respective payment amount of stable value digital asset tokens to each respective digital asset address of the first set of digital asset addresses, and wherein the publishing step (g) includes publishing the transaction instructions from the side ledger to the distributed asset ledger periodically or aperiodically.

In embodiments, the method may further comprise steps of: (i) receiving, at the digital asset first token issuer system, from at least one digital asset first token holder, a payment request prior to the obtaining step (c), the payment request including: (5) the digital asset address of the digital asset first token holder; and (6) a request to transfer a payment amount of stable value digital asset tokens to the digital asset address of the digital asset first token holder; and (0) confirming, at the digital asset first token issuer system, that: (1) the digital asset address of the digital asset first token holder is valid; (2) the digital asset first token amount of digital asset first tokens associated with the address of the digital asset first token holder is more than zero; and (3) the digital asset first token holder is entitled to payment; and (k) generating, at the digital asset first token issuer system, the first request based at least in part on the payment request when the digital asset address of the at least one digital asset first token holder is valid, the digital asset first token amount of digital asset first tokens associated with the digital asset address of the at least one digital asset first token holder is more than zero and the at least one digital asset first token holder is entitled to payment.

In embodiments, the first set of one or more computer readable media associated with the digital asset first token issuer system is operably connected to a node of the plurality of geographically distributed computer systems in the peer-to-peer network in the form of the blockchain, wherein the node is maintained by the digital asset first token issuer.

In embodiments, the digital asset first token database is maintained and stored on the plurality of geographically distributed computer systems in the peer-to-peer network.

In embodiments, the digital asset first token database is maintained on a sidechain, separate from the peer-to-peer network, wherein information on the sidechain is published and stored on the peer-to-peer network periodically or aperiodically.

In embodiments, the generating step (f) includes generating, by the digital asset token issuer system, transaction instructions for the first sum of stable value digital asset tokens by updating the stable value digital asset token database to reserve stable value digital asset tokens in the amount of the first sum.

In embodiments, the payment amount relates to a dividend to be paid based on ownership of each digital asset first token.

In embodiments, the payment amount relates to a royalty to be paid based on ownership of each digital asset first token.

In embodiments, the payment amount relates to interest to be paid based on ownership of each digital asset first token.

In embodiments, the peer-to-peer network uses a byzantine fault tolerance protocol as a consensus mechanism.

In embodiments, a method of issuing electronic payments using an amount of stable value digital asset tokens may comprise the steps of: (a) providing a digital asset first token database stored on a first set of one or more computer readable media associated with a digital asset first token issuer system associated with a digital asset first token issuer, wherein the digital asset first token database comprising a log of digital asset first tokens including: (i) a first set of digital asset addresses, each respective digital asset address of the first set of digital asset addresses tied to a distributed transaction ledger maintained by a plurality of geographically distributed computer systems in a peer-to-peer network in the form of a blockchain, the first set of digital asset addresses including a first respective digital asset address for each respective digital asset first token holder; and (ii) a respective digital asset first token amount associated with each respective first digital asset address; (b) providing a stable value digital asset token database stored on the distributed transaction ledger maintained by the plurality of geographically distributed computer systems in the peer-to-peer network, the stable value digital asset token database comprising a log of stable value digital asset token including: (i) a second set of digital asset addresses, each respective digital asset address of the second set of digital asset addresses tied to the distributed transaction ledger maintained by the plurality of geographically distributed computer systems in the peer-to-peer network, the second set of digital asset addresses including a second respective digital asset address for each respective stable value digital asset token holder; and (ii) a respective stable value digital asset token amount for each second respective stable value digital asset token address associated with a respective stable value digital asset token holder, wherein the stable value digital asset token stable value digital asset tokens are issued by a stable value administrator; (c) obtaining, by an administrator system associated with an administrator, a first sum of stable value digital asset tokens in a first designated public address associated with the blockchain, wherein the first sum of stable value digital asset tokens are backed by a second amount of currency maintained by a custodian based on a fixed ratio of the stable value digital asset token to the currency, and wherein the first designated public address corresponds to a first designated public key and a corresponding first designated private key; (d) accessing, by the administrator system, the digital asset first token database to determine: (i) each respective digital asset address of the first set of digital asset addresses for each respective digital asset first token holder; and (ii) the respective digital asset first token amount associated with each respective digital asset address; (e) determining a respective payment amount in stable value digital asset tokens to be made to each respective digital asset address of the first set of digital asset addresses based at least in part on the first sum of stable value digital asset tokens and the respective digital asset first token amount associated with each respective digital asset address of the first set of digital asset addresses; (f) generating, by the administrator system, transaction instructions to transfer the respective payment amount of stable value digital asset tokens from the designated public address to each respective digital asset address of the first set of digital asset addresses with a digital signature based on the first designated private key; (g) publishing, by the administrator system to the blockchain, the transaction instructions, wherein the plurality of geographically distributed computer systems implement the transaction instructions to transfer the respective payment amount of stable value digital asset tokens to each respective digital asset address of the first set of digital asset addresses, where ownership of each digital asset first token remains the same; and (h) confirming, by the administrator system, that each digital asset address of the first set of the digital asset addresses received the determined respective payment amount in stable value digital asset tokens based on reference to the blockchain.

In embodiments, the currency is a fiat currency.

In embodiments, the fiat currency is U.S. dollar.

In embodiments, the fixed ratio is one stable value digital asset token for 1 U.S. dollar.

In embodiments, the fixed ratio is 100 stable value digital asset tokens for one U.S. dollar.

In embodiments, the fiat currency is GB pound.

In embodiments, the fiat currency is SG dollar.

In embodiments, the fiat currency is EUR.

In embodiments, the fiat currency is HK dollar.

In embodiments, the fiat currency is Canadian dollar.

In embodiments, the fiat currency is Australian dollar.

In embodiments, the fiat currency is Yen.

In embodiments, the currency is a cryptocurrency.

In embodiments, the cryptocurrency is Bitcoin.

In embodiments, the cryptocurrency is Litecoin.

In embodiments, the cryptocurrency is Bitcoin Cash.

In embodiments, the cryptocurrency is Filecoin.

In embodiments, the cryptocurrency is Stellar.

In embodiments, the cryptocurrency is Polkadot.

In embodiments, the cryptocurrency is Atom.

In embodiments, the cryptocurrency is Tezos.

In embodiments, the blockchain is an Ethereum blockchain.

In embodiments, the blockchain is a Neo blockchain.

In embodiments, the method may further comprise: (i) notifying, by the administrator system, each digital asset address of the first set of the digital asset addresses of each respective transfer of stable value digital asset tokens to each respective digital asset address of the first set of digital asset addresses.

In embodiments, the digital asset first token is a security registered with a government authority.

In embodiments, the digital asset first token is a debt security and the electronic payments are interest.

In embodiments, the digital asset first token is an equity security and the electronic payments are dividends.

In embodiments, the digital asset first token is secured by intellectual property rights and the electronic payments are royalties.

In embodiments, the peer-to-peer network is based on a mathematical protocol for proof of work.

In embodiments, the peer-to-peer network is based on a mathematical protocol for proof of stake.

In embodiments, the peer-to-peer network is based on a cryptographic mathematical protocol.

In embodiments, the method may further comprise an additional step of publishing, by the administrator system to a side ledger, the transaction instructions associated with crediting the respective payment amount of stable value digital asset tokens to each respective digital asset address of the first set of digital asset addresses, and wherein the publishing step (g) includes publishing the transaction instructions from the side ledger to the distributed asset ledger periodically or aperiodically.

In embodiments, the method may further comprise steps of: (i) receiving, at the digital asset first token issuer system, from at least one digital asset first token holder, a payment request prior to the obtaining step (c), the payment request including: (7) the digital asset address of the digital asset first token holder; and (8) a request to transfer a payment amount of stable value digital asset tokens to the digital asset address of the digital asset first token holder; and (j) confirming, at the digital asset first token issuer system, that: (1) the digital asset address of the digital asset first token holder is valid; (2) the digital asset first token amount of digital asset first tokens associated with the address of the digital asset first token holder is more than zero; and (3) the digital asset first token holder is entitled to payment; and (k) generating, at the digital asset first token issuer system, the first request based at least in part on the payment request when the digital asset address of the at least one digital asset first token holder is valid, the digital asset first token amount of digital asset first tokens associated with the digital asset address of the at least one digital asset first token holder is more than zero and the at least one digital asset first token holder is entitled to payment.

In embodiments, the first set of one or more computer readable media associated with the digital asset first token issuer system is operably connected to a node of the plurality of geographically distributed computer systems in the peer-to-peer network in the form of the blockchain, wherein the node is maintained by the digital asset first token issuer.

In embodiments, the digital asset first token database is maintained and stored on the plurality of geographically distributed computer systems in the peer-to-peer network.

In embodiments, the digital asset first token database is maintained on a sidechain, separate from the peer-to-peer network, wherein information on the sidechain is published and stored on the peer-to-peer network periodically or aperiodically.

In embodiments, the generating step (f) includes generating, by the administrator system, transaction instructions for the first sum of stable value digital asset tokens by updating the stable value digital asset token database to reserve stable value digital asset tokens in the amount of the first sum.

In embodiments, the payment amount relates to a dividend to be paid based on ownership of each digital asset first token.

In embodiments, the payment amount relates to a royalty to be paid based on ownership of each digital asset first token.

In embodiments, the payment amount relates to interest to be paid based on ownership of each digital asset first token.

In embodiments, the peer-to-peer network uses a byzantine fault tolerance protocol as a consensus mechanism.

In embodiments, a method of issuing electronic payments using an amount of stable value digital asset tokens may comprise the steps of: (a) providing a digital asset first token database stored on a first set of one or more computer readable media associated with a digital asset first token issuer system associated with a digital asset first token issuer, wherein the digital asset first token database comprising a log of digital asset first tokens including: (i) a first set of digital asset addresses, each respective digital asset address of the first set of digital asset addresses tied to a distributed transaction ledger maintained by a plurality of geographically distributed computer systems in a peer-to-peer network in the form of a blockchain, the first set of digital asset addresses including a first respective digital asset address for each respective digital asset first token holder; and (ii) a respective digital asset first token amount associated with each respective first digital asset address; (b) providing a stable value digital asset token database stored on the distributed transaction ledger maintained by the plurality of geographically distributed computer systems in the peer-to-peer network, the stable value digital asset token database comprising a log of stable value digital asset token including: (i) a second set of digital asset addresses, each respective digital asset address of the second set of digital asset addresses tied to the distributed transaction ledger maintained by the plurality of geographically distributed computer systems in the peer-to-peer network, the second set of digital asset addresses including a second respective digital asset address for each respective stable value digital asset token holder; and (ii) a respective stable value digital asset token amount for each second respective stable value digital asset token address associated with a respective stable value digital asset token holder, wherein the stable value digital asset token stable value digital asset tokens are issued by a stable value digital asset token issuer; (c) obtaining, by a digital asset exchange system associated with a digital asset exchange, a first sum of stable value digital asset tokens in a first designated public address associated with the blockchain, wherein the first sum of stable value digital asset tokens are backed by a second amount of currency maintained by a custodian based on a fixed ratio of the stable value digital asset token to the currency, and wherein the first designated public address corresponds to a first designated public key and a corresponding first designated private key; (d) accessing, by the digital asset exchange system, the digital asset first token database to determine: (i) each respective digital asset address of the first set of digital asset addresses for each respective digital asset first token holder; and (ii) the respective digital asset first token amount associated with each respective digital asset address; (e) determining a respective payment amount in stable value digital asset tokens to be made to each respective digital asset address of the first set of digital asset addresses based at least in part on the first sum of stable value digital asset tokens and the respective digital asset first token amount associated with each respective digital asset address of the first set of digital asset addresses; (f) generating, by the digital asset exchange system, transaction instructions to transfer the respective payment amount of stable value digital asset tokens from the designated public address to each respective digital asset address of the first set of digital asset addresses with a digital signature based on the first designated private key; (g) publishing, by the digital asset exchange system to the blockchain, the transaction instructions, wherein the plurality of geographically distributed computer systems implement the transaction instructions to transfer the respective payment amount of stable value digital asset tokens to each respective digital asset address of the first set of digital asset addresses, where ownership of each digital asset first token remains the same; and (h) confirming, by the digital asset exchange system, that each digital asset address of the first set of the digital asset addresses received the determined respective payment amount in stable value digital asset tokens based on reference to the blockchain.

In embodiments, the currency is a fiat currency.

In embodiments, the fiat currency is U.S. dollar.

In embodiments, the fixed ratio is one stable value digital asset token for 1 U.S. dollar.

In embodiments, the fixed ratio is 100 stable value digital asset tokens for one U.S. dollar.

In embodiments, the fiat currency is GB pound.

In embodiments, the flat currency is SG dollar.

In embodiments, the fiat currency is EUR.

In embodiments, the fiat currency is HK dollar.

In embodiments, the fiat currency is Canadian dollar.

In embodiments, the fiat currency is Australian dollar.

In embodiments, the flat currency is Yen.

In embodiments, the currency is a cryptocurrency.

In embodiments, the cryptocurrency is Bitcoin.

In embodiments, the cryptocurrency is Litecoin.

In embodiments, the cryptocurrency is Bitcoin Cash.

In embodiments, the cryptocurrency is Filecoin.

In embodiments, the cryptocurrency is Zcash.

In embodiments, the cryptocurrency is Stellar.

In embodiments, the cryptocurrency is Polkadot.

In embodiments, the cryptocurrency is Atom.

In embodiments, the cryptocurrency is Tezos.

In embodiments, the blockchain is an Ethereum blockchain.

In embodiments, the blockchain is a Neo blockchain.

In embodiments, the method may further comprise: (i) notifying, by the digital asset exchange system, each digital asset address of the first set of the digital asset addresses of each respective transfer of stable value digital asset tokens to each respective digital asset address of the first set of digital asset addresses.

In embodiments, the digital asset first token is a security registered with a government authority.

In embodiments, the digital asset first token is a debt security and the electronic payments are interest.

In embodiments, the digital asset first token is an equity security and the electronic payments are dividends.

In embodiments, the digital asset first token is secured by intellectual property rights and the electronic payments are royalties.

In embodiments, the peer-to-peer network is based on a mathematical protocol for proof of work.

In embodiments, the peer-to-peer network is based on a mathematical protocol for proof of stake.

In embodiments, the peer-to-peer network is based on a cryptographic mathematical protocol.

In embodiments, a method may further comprise an additional step of publishing, by the digital asset exchange system to a side ledger, the transaction instructions associated with crediting the respective payment amount of stable value digital asset tokens to each respective digital asset address of the first set of digital asset addresses, and wherein the publishing step (g) includes publishing the transaction instructions from the side ledger to the distributed asset ledger periodically or aperiodically.

In embodiments, the method may further comprise steps of: (i) receiving, at the digital asset first token issuer system, from at least one digital asset first token holder, a payment request prior to the obtaining step (c), the payment request including: (9) the digital asset address of the digital asset first token holder; and (10) a request to transfer a payment amount of stable value digital asset tokens to the digital asset address of the digital asset first token holder; and (j) confirming, at the digital asset first token issuer system, that: (1) the digital asset address of the digital asset first token holder is valid; (2) the digital asset first token amount of digital asset first tokens associated with the address of the digital asset first token holder is more than zero; and (3) the digital asset first token holder is entitled to payment; and (k) generating, at the digital asset first token issuer system, the first request based at least in part on the payment request when the digital asset address of the at least one digital asset first token holder is valid, the digital asset first token amount of digital asset first tokens associated with the digital asset address of the at least one digital asset first token holder is more than zero and the at least one digital asset first token holder is entitled to payment.

In embodiments, the first set of one or more computer readable media associated with the digital asset first token issuer system is operably connected to a node of the plurality of geographically distributed computer systems in the peer-to-peer network in the form of the blockchain, wherein the node is maintained by the digital asset first token issuer.

In embodiments, the digital asset first token database is maintained and stored on the plurality of geographically distributed computer systems in the peer-to-peer network.

In embodiments, the digital asset first token database is maintained on a sidechain, separate from the peer-to-peer network, wherein information on the sidechain is published and stored on the peer-to-peer network periodically or aperiodically.

In embodiments, the generating step (f) includes generating, by the digital asset exchange system, transaction instructions for the first sum of stable value digital asset tokens by updating the stable value digital asset token database to reserve stable value digital asset tokens in the amount of the first sum.

In embodiments, the payment amount relates to a dividend to be paid based on ownership of each digital asset first token.

In embodiments, the payment amount relates to a royalty to be paid based on ownership of each digital asset first token.

In embodiments, the payment amount relates to interest to be paid based on ownership of each digital asset first token.

In embodiments, the peer-to-peer network uses a byzantine fault tolerance protocol as a consensus mechanism.

In embodiments, a method of issuing electronic payments using an amount of stable value digital asset tokens may comprise the steps of: (a) providing a digital asset first token database stored on a first set of one or more computer readable media associated with a digital asset first token issuer system associated with a digital asset first token issuer, wherein the digital asset first token database comprising a log of digital asset first tokens including: (i) a first set of digital asset addresses, each respective digital asset address of the first set of digital asset addresses tied to a distributed transaction ledger maintained by a plurality of geographically distributed computer systems in a peer-to-peer network in the form of a blockchain, the first set of digital asset addresses including a first respective digital asset address for each respective digital asset first token holder; and (ii) a respective digital asset first token amount associated with each respective first digital asset address; (b) providing a stable value digital asset token database stored on the distributed transaction ledger maintained by the plurality of geographically distributed computer systems in the peer-to-peer network, the stable value digital asset token database comprising a log of stable value digital asset token including: (i) a second set of digital asset addresses, each respective digital asset address of the second set of digital asset addresses tied to the distributed transaction ledger maintained by the plurality of geographically distributed computer systems in the peer-to-peer network, the second set of digital asset addresses including a second respective digital asset address for each respective stable value digital asset token holder; and (ii) a respective stable value digital asset token amount for each second respective stable value digital asset token address associated with a respective stable value digital asset token holder, wherein the stable value digital asset token stable value digital asset tokens are issued by a stable value digital asset token issuer; (c) obtaining, by a digital asset token issuer system associated with a digital asset token issuer, a first sum of stable value digital asset tokens in a first designated public address associated with the blockchain, wherein the first sum of stable value digital asset tokens are backed by a second amount of currency maintained by a custodian based on a fixed ratio of the stable value digital asset token to the currency, and wherein the first designated public address corresponds to a first designated public key and a corresponding first designated private key; (d) accessing, by the digital asset token issuer system, the digital asset first token database to determine: (i) each respective digital asset address of the first set of digital asset addresses for each respective digital asset first token holder; and (ii) the respective digital asset first token amount associated with each respective digital asset address; (e) determining a respective payment amount in stable value digital asset tokens to be made to each respective digital asset address of the first set of digital asset addresses based at least in part on the first sum of stable value digital asset tokens and the respective digital asset first token amount associated with each respective digital asset address of the first set of digital asset addresses; (f) generating, by the digital asset token issuer system, transaction instructions to transfer the respective payment amount of stable value digital asset tokens from the designated public address to each respective digital asset address of the first set of digital asset addresses with a digital signature based on the first designated private key; (g) publishing, by the digital asset token issuer system to the blockchain, the transaction instructions, wherein the plurality of geographically distributed computer systems implement the transaction instructions to transfer the respective payment amount of stable value digital asset tokens to each respective digital asset address of the first set of digital asset addresses, where ownership of each digital asset first token remains the same; and (h) confirming, by the digital asset token issuer system, that each digital asset address of the first set of the digital asset addresses received the determined respective payment amount in stable value digital asset tokens based on reference to the blockchain.

In embodiments, the currency is a fiat currency.

In embodiments, the fiat currency is U.S. dollar.

In embodiments, the fixed ratio is one stable value digital asset token for 1 U.S. dollar.

In embodiments, the fixed ratio is 100 stable value digital asset tokens for one U.S. dollar.

In embodiments, the fiat currency is GB pound.

In embodiments, the fiat currency is SG dollar.

In embodiments, the fiat currency is EUR.

In embodiments, the fiat currency is HK dollar.

In embodiments, the fiat currency is Canadian dollar.

In embodiments, the fiat currency is Australian dollar.

In embodiments, the fiat currency is Yen.

In embodiments, the currency is a cryptocurrency.

In embodiments, the cryptocurrency is Bitcoin.

In embodiments, the cryptocurrency is Litecoin.

In embodiments, the cryptocurrency is Bitcoin Cash.

In embodiments, the cryptocurrency is Filecoin.

In embodiments, the cryptocurrency is Zcash.

In embodiments, the cryptocurrency is Stellar.

In embodiments, the cryptocurrency is Polkadot.

In embodiments, the cryptocurrency is Atom.

In embodiments, the cryptocurrency is Tezos.

In embodiments, the blockchain is an Ethereum blockchain.

In embodiments, the blockchain is a Neo blockchain.

In embodiments, the method may further comprise: (i) notifying, by the digital asset token issuer system, each digital asset address of the first set of the digital asset addresses of each respective transfer of stable value digital asset tokens to each respective digital asset address of the first set of digital asset addresses.

In embodiments, the digital asset first token is a security registered with a government authority.

In embodiments, the digital asset first token is an equity security and the electronic payments are dividends.

In embodiments, the digital asset first token is secured by intellectual property rights and the electronic payments are royalties.

In embodiments, the peer-to-peer network is based on a mathematical protocol for proof of work.

In embodiments, the peer-to-peer network is based on a mathematical protocol for proof of stake.

In embodiments, the peer-to-peer network is based on a cryptographic mathematical protocol.

In embodiments, the method may further comprise an additional step of publishing, by the digital asset token issuer system to a side ledger, the transaction instructions associated with crediting the respective payment amount of stable value digital asset tokens to each respective digital asset address of the first set of digital asset addresses, and wherein the publishing step (g) includes publishing the transaction instructions from the side ledger to the distributed asset ledger periodically or aperiodically.

In embodiments, the method may further comprise steps of: (i) receiving, at the digital asset first token issuer system, from at least one digital asset first token holder, a payment request prior to the obtaining step (c), the payment request including: (11) the digital asset address of the digital asset first token holder; and (12) a request to transfer a payment amount of stable value digital asset tokens to the digital asset address of the digital asset first token holder; and (j) confirming, at the digital asset first token issuer system, that: (1) the digital asset address of the digital asset first token holder is valid; (2) the digital asset first token amount of digital asset first tokens associated with the address of the digital asset first token holder is more than zero; and (3) the digital asset first token holder is entitled to payment; and (k) generating, at the digital asset first token issuer system, the first request based at least in part on the payment request when the digital asset address of the at least one digital asset first token holder is valid, the digital asset first token amount of digital asset first tokens associated with the digital asset address of the at least one digital asset first token holder is more than zero and the at least one digital asset first token holder is entitled to payment.

In embodiments, the first set of one or more computer readable media associated with the digital asset first token issuer system is operably connected to a node of the plurality of geographically distributed computer systems in the peer-to-peer network in the form of the blockchain, wherein the node is maintained by the digital asset first token issuer.

In embodiments, the digital asset first token database is maintained and stored on the plurality of geographically distributed computer systems in the peer-to-peer network.

In embodiments, the digital asset first token database is maintained on a sidechain, separate from the peer-to-peer network, wherein information on the sidechain is published and stored on the peer-to-peer network periodically or aperiodically.

In embodiments, the generating step (f) includes generating, by the digital asset token issuer system, transaction instructions for the first sum of stable value digital asset tokens by updating the stable value digital asset token database to reserve stable value digital asset tokens in the amount of the first sum.

In embodiments, the payment amount relates to a dividend to be paid based on ownership of each digital asset first token.

In embodiments, the payment amount relates to a royalty to be paid based on ownership of each digital asset first token.

In embodiments, the payment amount relates to interest to be paid based on ownership of each digital asset first token.

In embodiments, the peer-to-peer network uses a byzantine fault tolerance protocol as a consensus mechanism.

In embodiments, a method of issuing electronic payments using an amount of stable value digital asset tokens may comprise the steps of: (a) obtaining, by an administrator system associated with an administrator, a first sum of stable value digital asset tokens in a first designated public address associated with a first blockchain, wherein the first sum of stable value digital asset tokens are backed by a second amount of a second digital asset maintained by a custodian based on a fixed ratio of the stable value digital asset token to the second digital asset, wherein the first designated public address corresponds to a first designated public key and a corresponding first designated private key; wherein the stable value digital asset token is maintained in a stable value digital asset token database stored on a first distributed transaction ledger maintained in the form of the first blockchain by a plurality of geographically distributed computer systems in a first blockchain network; wherein the second digital asset is maintained in a second digital asset database stored on a second distributed transaction ledger maintained in the form of a second blockchain by a plurality of geographically distributed computer systems in a second blockchain network; the stable value digital asset token database comprising a log of stable value digital asset tokens including: (i) a first set of digital asset addresses, each respective digital asset address of the first set of digital asset addresses in the first distributed transaction ledger maintained by the plurality of geographically distributed computer systems in the first blockchain network, the first set of digital asset addresses including a first respective digital asset address for each respective stable value digital asset first token holder; and (ii) a respective digital asset first token amount for each first respective stable value digital asset token address associated with a respective stable value digital asset token holder, wherein the stable value digital asset tokens are issued by a stable value digital asset token issuer; (b) obtaining, by the administrator system, (A) each respective digital asset address of a second set of digital asset addresses for each respective digital asset first token holder of a plurality of digital asset first token holders; and (B) a respective digital asset first token amount associated with each respective digital asset address of the second set of digital asset addresses; from a digital asset first token database stored on a second set of one or more computer readable media, the one or more computer readable media associated with a digital asset first token issuer system associated with a digital asset first token issuer, wherein the digital asset first token database comprises a log of digital asset first tokens including: (i) the second set of digital asset addresses, each respective digital asset address of the second set of digital asset addresses in the distributed transaction ledger in the form of the blockchain maintained by the plurality of geographically distributed computer systems in the first blockchain network, the second set of digital asset addresses including a second respective digital asset address for each respective stable value digital asset token holder; and (ii) the respective digital asset first token amount associated with each respective second digital asset address; (c) determining, by the administrator system, a respective payment amount in stable value digital asset tokens to be made to each respective digital asset address of the second set of digital asset addresses wherein the payment amount is determined on a pro rata basis with respect to a sum of the respective digital asset first token amounts for the second set of digital asset addresses; (d) generating, by the administrator system, transaction instructions to transfer the respective payment amount of stable value digital asset tokens from the designated public address to each respective digital asset address of the second set of digital asset addresses with a digital signature based on the first designated private key; (e) publishing, by the administrator system to the first blockchain, the transaction instructions, wherein the plurality of geographically distributed computer systems implement the transaction instructions to transfer the respective payment amount of stable value digital asset tokens to each respective digital asset address of the second set of digital asset addresses; and (f) confirming, by the administrator system, that each digital asset address of the second set of the digital asset addresses received the determined respective payment amount in stable value digital asset tokens based on reference to the blockchain and that the respective digital asset first token amount for each digital asset address of the second set of digital asset address has not changed.

In embodiments, the blockchain is an Ethereum blockchain.

In embodiments, the blockchain is a Bitcoin blockchain.

In embodiments, the method may further comprise: (g) notifying, by the administrator system, each digital asset address of the second set of the digital asset addresses of each respective transfer of stable value digital asset tokens to each respective digital asset address of the second set of digital asset addresses.

In embodiments, the blockchain is a Stellar blockchain.

In embodiments, the administrator is a regulated digital asset exchange.

In embodiments, the digital asset first token is a security registered with a government authority.

In embodiments, the digital asset first token is a debt security and the electronic payments are interest.

In embodiments, the digital asset first token is an equity security and the electronic payments are dividends.

In embodiments, the digital asset first token is secured by intellectual property rights and the electronic payments are royalties.

In embodiments, the first blockchain is based on a mathematical protocol for proof of work.

In embodiments, the mathematical protocol is open source.

In embodiments, the first blockchain is based on a mathematical protocol for proof of stake.

In embodiments, the mathematical protocol is open source.

In embodiments, the first blockchain is based on a cryptographic mathematical protocol.

In embodiments, the method may further comprise a step of publishing, by the administrator system to a side ledger, the transaction instructions associated with transferring the respective payment amount of stable value digital asset tokens to each respective digital asset address of the second set of digital asset addresses and the publishing step (e) includes publishing the transaction instructions from the side ledger to the distributed asset ledger periodically or aperiodically.

In embodiments, the method may further comprise the steps of: (g) receiving, at the digital asset first token issuer system, from at least one digital asset first token holder, a payment request prior to the obtaining step (a), the payment request including: (i) the digital asset address of the digital asset first token holder; and (ii) a request to transfer a payment amount of stable value digital asset tokens to the digital asset address of the digital asset first token holder; and (h) confirming, at the digital asset first token issuer system, that: (i) the digital asset address of the digital asset first token holder is valid; (ii) the digital asset first token amount of digital asset first tokens associated with the digital address of the digital asset first token holder is more than zero; and (iii) the digital asset first token holder is entitled to payment.

In embodiments, the digital asset first token database is maintained and stored on the plurality of geographically distributed computer systems in the first blockchain network.

In embodiments, the digital asset first token database is maintained on a sidechain, separate from the blockchain network, wherein information on the sidechain is published and stored on the blockchain network periodically or aperiodically.

In embodiments, the generating step (d) includes generating, by the administrator system, transaction instructions for the first sum of stable value digital asset tokens by updating the stable value digital asset token database to reserve stable value digital asset tokens in the amount of the first sum.

In embodiments, the payment amount relates to a dividend to be paid based on ownership of each digital asset first token.

In embodiments, the payment amount relates to a royalty to be paid based on ownership of each digital asset first token.

In embodiments, the payment amount relates to interest to be paid based on ownership of each digital asset first token.

In embodiments, the first blockchain network uses a byzantine fault tolerance protocol as a consensus mechanism.

In embodiments, the second digital asset is Bitcoin.

In embodiments, the second digital asset is Bitcoin Cash.

In embodiments, the second digital asset is Stellar.

In embodiments, the second digital asset is Filecoin.

In embodiments, the second digital asset is Litecoin.

In embodiments, the second digital asset is Tezos.

In embodiments, the second digital asset is Zcash.

In embodiments, the second digital asset is Polkadot.

In embodiments, the second digital asset is Atom.

In embodiments, the digital asset stable value tokens are issued by the stable value digital asset token issuer through one or more nodes associated with the stable value digital asset token issuer.

In embodiments, a method of issuing electronic payments using an amount of stable value digital asset tokens may comprise the steps of: (a) obtaining, by a digital asset exchange system associated with a digital asset exchange, a first sum of stable value digital asset tokens in a first designated public address associated with a first blockchain, wherein the first sum of stable value digital asset tokens are backed by a second amount of a second digital asset maintained by a custodian based on a fixed ratio of the stable value digital asset token to the second digital asset, wherein the first designated public address corresponds to a first designated public key and a corresponding first designated private key; wherein the stable value digital asset token is maintained in a stable value digital asset token database stored on a first distributed transaction ledger maintained in the form of the first blockchain by a plurality of geographically distributed computer systems in a first blockchain network; wherein the second digital asset is maintained in a second digital asset database stored on a second distributed transaction ledger maintained in the form of a second blockchain by a plurality of geographically distributed computer systems in a second blockchain network; the stable value digital asset token database comprising a log of stable value digital asset tokens including: (i) a first set of digital asset addresses, each respective digital asset address of the first set of digital asset addresses in the first distributed transaction ledger maintained by the plurality of geographically distributed computer systems in the first blockchain network, the first set of digital asset addresses including a first respective digital asset address for each respective stable value digital asset first token holder; and (ii) a respective digital asset first token amount for each first respective stable value digital asset token address associated with a respective stable value digital asset token holder, wherein the stable value digital asset tokens are issued by a stable value digital asset token issuer; (b) obtaining, by the digital asset exchange system, (A) each respective digital asset address of a second set of digital asset addresses for each respective digital asset first token holder of a plurality of digital asset first token holders; and (B) a respective digital asset first token amount associated with each respective digital asset address of the second set of digital asset addresses; from a digital asset first token database stored on a second set of one or more computer readable media, the one or more computer readable media associated with a digital asset first token issuer system associated with a digital asset first token issuer, wherein the digital asset first token database comprises a log of digital asset first tokens including: (i) the second set of digital asset addresses, each respective digital asset address of the second set of digital asset addresses in the distributed transaction ledger in the form of the blockchain maintained by the plurality of geographically distributed computer systems in the first blockchain network, the second set of digital asset addresses including a second respective digital asset address for each respective stable value digital asset token holder; and (ii) the respective digital asset first token amount associated with each respective second digital asset address; (c) determining, by the digital asset exchange system, a respective payment amount in stable value digital asset tokens to be made to each respective digital asset address of the second set of digital asset addresses wherein the payment amount is determined on a pro rata basis with respect to a sum of the respective digital asset first token amounts for the second set of digital asset addresses; (d) generating, by the digital asset exchange system, transaction instructions to transfer the respective payment amount of stable value digital asset tokens from the designated public address to each respective digital asset address of the second set of digital asset addresses with a digital signature based on the first designated private key; (e) publishing, by the digital asset exchange system to the first blockchain, the transaction instructions, wherein the plurality of geographically distributed computer systems implement the transaction instructions to transfer the respective payment amount of stable value digital asset tokens to each respective digital asset address of the second set of digital asset addresses; and (f) confirming, by the digital asset exchange system, that each digital asset address of the second set of the digital asset addresses received the determined respective payment amount in stable value digital asset tokens based on reference to the blockchain and that the respective digital asset first token amount for each digital asset address of the second set of digital asset address has not changed.

In embodiments, the blockchain is an Ethereum blockchain.

In embodiments, the blockchain is a Bitcoin blockchain.

In embodiments, the method may further comprise: (g) notifying, by the digital asset exchange system, each digital asset address of the second set of the digital asset addresses of each respective transfer of stable value digital asset tokens to each respective digital asset address of the second set of digital asset addresses.

In embodiments, the blockchain is a Stellar blockchain.

In embodiments, the digital asset exchange is a regulated digital asset exchange.

In embodiments, the digital asset first token is a security registered with a government authority.

In embodiments, the digital asset first token is a debt security and the electronic payments are interest.

In embodiments, the digital asset first token is an equity security and the electronic payments are dividends.

In embodiments, the digital asset first token is secured by intellectual property rights and the electronic payments are royalties.

In embodiments, the first blockchain is based on a mathematical protocol for proof of work.

In embodiments, the mathematical protocol is open source.

In embodiments, the first blockchain is based on a mathematical protocol for proof of stake.

In embodiments, the mathematical protocol is open source.

In embodiments, the first blockchain is based on a cryptographic mathematical protocol.

In embodiments, the method may further comprise a step of publishing, by the digital asset exchange system to a side ledger, the transaction instructions associated with transferring the respective payment amount of stable value digital asset tokens to each respective digital asset address of the second set of digital asset addresses and the publishing step (e) includes publishing the transaction instructions from the side ledger to the distributed asset ledger periodically or aperiodically.

In embodiments, the method may further comprise the steps of: (g) receiving, at the digital asset first token issuer system, from at least one digital asset first token holder, a payment request prior to the obtaining step (a), the payment request including: (i) the digital asset address of the digital asset first token holder; and (ii) a request to transfer a payment amount of stable value digital asset tokens to the digital asset address of the digital asset first token holder; and (h) confirming, at the digital asset first token issuer system, that: (i) the digital asset address of the digital asset first token holder is valid; (ii) the digital asset first token amount of digital asset first tokens associated with the digital address of the digital asset first token holder is more than zero; and (iii) the digital asset first token holder is entitled to payment.

In embodiments, the digital asset first token database is maintained and stored on the plurality of geographically distributed computer systems in the first blockchain network.

In embodiments, the digital asset first token database is maintained on a sidechain, separate from the blockchain network, wherein information on the sidechain is published and stored on the blockchain network periodically or aperiodically.

In embodiments, the generating step (d) includes generating, by the digital asset exchange system, transaction instructions for the first sum of stable value digital asset tokens by updating the stable value digital asset token database to reserve stable value digital asset tokens in the amount of the first sum.

In embodiments, the payment amount relates to a dividend to be paid based on ownership of each digital asset first token.

In embodiments, the payment amount relates to a royalty to be paid based on ownership of each digital asset first token.

In embodiments, the payment amount relates to interest to be paid based on ownership of each digital asset first token.

In embodiments, the first blockchain network uses a byzantine fault tolerance protocol as a consensus mechanism.

In embodiments, the second digital asset is Bitcoin.

In embodiments, the second digital asset is Bitcoin Cash.

In embodiments, the second digital asset is Stellar.

In embodiments, the second digital asset is Filecoin.

In embodiments, the second digital asset is Litecoin.

In embodiments, the second digital asset is Tezos.

In embodiments, the second digital asset is Zcash.

In embodiments, the second digital asset is Polkadot.

In embodiments, the second digital asset is Atom.

In embodiments, the digital asset stable value tokens are issued by the stable value digital asset token issuer through one or more nodes associated with the stable value digital asset token issuer.

In embodiments, a method of issuing electronic payments using an amount of stable value digital asset tokens may comprise the steps of: (a) obtaining, by a digital asset token issuer system associated with a digital asset token issuer, a first sum of stable value digital asset tokens in a first designated public address associated with a first blockchain, wherein the first sum of stable value digital asset tokens are backed by a second amount of a second digital asset maintained by a custodian based on a fixed ratio of the stable value digital asset token to the second digital asset, wherein the first designated public address corresponds to a first designated public key and a corresponding first designated private key; wherein the stable value digital asset token is maintained in a stable value digital asset token database stored on a first distributed transaction ledger maintained in the form of the first blockchain by a plurality of geographically distributed computer systems in a first blockchain network; wherein the second digital asset is maintained in a second digital asset database stored on a second distributed transaction ledger maintained in the form of a second blockchain by a plurality of geographically distributed computer systems in a second blockchain network; the stable value digital asset token database comprising a log of stable value digital asset tokens including: (i) a first set of digital asset addresses, each respective digital asset address of the first set of digital asset addresses in the first distributed transaction ledger maintained by the plurality of geographically distributed computer systems in the first blockchain network, the first set of digital asset addresses including a first respective digital asset address for each respective stable value digital asset first token holder; and (ii) a respective digital asset first token amount for each first respective stable value digital asset token address associated with a respective stable value digital asset token holder, wherein the stable value digital asset tokens are issued by a stable value digital asset token issuer; (b) obtaining, by the digital asset token issuer system, (A) each respective digital asset address of a second set of digital asset addresses for each respective digital asset first token holder of a plurality of digital asset first token holders; and (B) a respective digital asset first token amount associated with each respective digital asset address of the second set of digital asset addresses; from a digital asset first token database stored on a second set of one or more computer readable media, the one or more computer readable media associated with a digital asset first token issuer system associated with a digital asset first token issuer, wherein the digital asset first token database comprises a log of digital asset first tokens including: (i) the second set of digital asset addresses, each respective digital asset address of the second set of digital asset addresses in the distributed transaction ledger in the form of the blockchain maintained by the plurality of geographically distributed computer systems in the first blockchain network, the second set of digital asset addresses including a second respective digital asset address for each respective stable value digital asset token holder; and (ii) the respective digital asset first token amount associated with each respective second digital asset address; (c) determining, by the digital asset token issuer system, a respective payment amount in stable value digital asset tokens to be made to each respective digital asset address of the second set of digital asset addresses wherein the payment amount is determined on a pro rata basis with respect to a sum of the respective digital asset first token amounts for the second set of digital asset addresses; (d) generating, by the digital asset token issuer system, transaction instructions to transfer the respective payment amount of stable value digital asset tokens from the designated public address to each respective digital asset address of the second set of digital asset addresses with a digital signature based on the first designated private key; (e) publishing, by the digital asset token issuer system to the first blockchain, the transaction instructions, wherein the plurality of geographically distributed computer systems implement the transaction instructions to transfer the respective payment amount of stable value digital asset tokens to each respective digital asset address of the second set of digital asset addresses; and (f) confirming, by the digital asset token issuer system, that each digital asset address of the second set of the digital asset addresses received the determined respective payment amount in stable value digital asset tokens based on reference to the blockchain and that the respective digital asset first token amount for each digital asset address of the second set of digital asset address has not changed.

In embodiments, the blockchain is an Ethereum blockchain.

In embodiments, the blockchain is a Bitcoin blockchain.

In embodiments, the method may further comprise: (g) notifying, by the digital asset token issuer system, each digital asset address of the second set of the digital asset addresses of each respective transfer of stable value digital asset tokens to each respective digital asset address of the second set of digital asset addresses.

In embodiments, the blockchain is a Stellar blockchain.

In embodiments, the digital asset token issuer is a regulated digital asset exchange.

In embodiments, the digital asset first token is a security registered with a government authority.

In embodiments, the digital asset first token is a debt security and the electronic payments are interest.

In embodiments, the digital asset first token is an equity security and the electronic payments are dividends.

In embodiments, the digital asset first token is secured by intellectual property rights and the electronic payments are royalties.

In embodiments, the first blockchain is based on a mathematical protocol for proof of work.

In embodiments, the mathematical protocol is open source.

In embodiments, the first blockchain is based on a mathematical protocol for proof of stake.

In embodiments, the mathematical protocol is open source.

In embodiments, the first blockchain is based on a cryptographic mathematical protocol.

In embodiments, the method may further comprise a step of publishing, by the digital asset token issuer system to a side ledger, the transaction instructions associated with transferring the respective payment amount of stable value digital asset tokens to each respective digital asset address of the second set of digital asset addresses and the publishing step (e) includes publishing the transaction instructions from the side ledger to the distributed asset ledger periodically or aperiodically.

In embodiments, the method may further comprise the steps of: (g) receiving, at the digital asset first token issuer system, from at least one digital asset first token holder, a payment request prior to the obtaining step (a), the payment request including: (i) the digital asset address of the digital asset first token holder; and (ii) a request to transfer a payment amount of stable value digital asset tokens to the digital asset address of the digital asset first token holder; and (h) confirming, at the digital asset first token issuer system, that: (i) the digital asset address of the digital asset first token holder is valid; (ii) the digital asset first token amount of digital asset first tokens associated with the digital address of the digital asset first token holder is more than zero: and (iii) the digital asset first token holder is entitled to payment.

In embodiments, the digital asset first token database is maintained and stored on the plurality of geographically distributed computer systems in the first blockchain network.

In embodiments, the digital asset first token database is maintained on a sidechain, separate from the blockchain network, wherein information on the sidechain is published and stored on the blockchain network periodically or aperiodically.

In embodiments, the generating step (d) includes generating, by the digital asset token issuer system, transaction instructions for the first sum of stable value digital asset tokens by updating the stable value digital asset token database to reserve stable value digital asset tokens in the amount of the first sum.

In embodiments, the payment amount relates to a dividend to be paid based on ownership of each digital asset first token.

In embodiments, the payment amount relates to a royalty to be paid based on ownership of each digital asset first token.

In embodiments, the payment amount relates to interest to be paid based on ownership of each digital asset first token.

In embodiments, the first blockchain network uses a byzantine fault tolerance protocol as a consensus mechanism.

In embodiments, the second digital asset is Bitcoin.

In embodiments, the second digital asset is Bitcoin Cash.

In embodiments, the second digital asset is Stellar.

In embodiments, the second digital asset is Filecoin.

In embodiments, the second digital asset is Litecoin.

In embodiments, the second digital asset is Tezos.

In embodiments, the second digital asset is Zcash.

In embodiments, the second digital asset is Polkadot.

In embodiments, the second digital asset is Atom.

In embodiments, the digital asset stable value tokens are issued by the stable value digital asset token issuer through one or more nodes associated with the stable value digital asset token issuer.

In embodiments, a method of issuing electronic payments using an amount of stable value digital asset tokens may comprise the steps of: (a) obtaining, by an administrator system associated with an administrator, a first sum of stable value digital asset tokens in a first designated public address associated with a blockchain, wherein the first sum of stable value digital asset tokens are backed by a second sum of currency maintained by a custodian based on a fixed ratio of the stable value digital asset token to the currency, wherein the first designated public address corresponds to a first designated public key and a corresponding first designated private key; wherein the stable value digital asset token is maintained in a stable value digital asset token database stored on a distributed transaction ledger in the form of a blockchain associated with an underlying asset maintained by a plurality of geographically distributed computer systems in a blockchain network, the stable value digital asset token database comprising a log of stable value digital asset tokens including: (i) a first set of digital asset addresses, each respective digital asset address of the first set of digital asset addresses in the distributed transaction ledger maintained by the plurality of geographically distributed computer systems in the blockchain network, the first set of digital asset addresses including a first respective digital asset token address for each respective stable value digital asset token holder; (ii) a respective stable value digital asset token amount for each first respective stable value digital asset token address associated with a respective stable value digital asset token holder, wherein the stable value digital asset tokens are issued by a stable value digital asset token issuer; (b) obtaining, by the administrator system, (A) each respective digital asset address of a second set of digital asset addresses for each respective digital asset first token holder of a plurality of digital asset first token holders; and (B) a respective digital asset first token amount associated with each respective digital asset address of the second set of digital asset addresses; from a digital asset first token database stored on a second set of one or more computer readable media, the one or more computer readable media associated with a digital asset first token issuer system associated with a digital asset first token issuer, wherein the digital asset first token database comprises a log of digital asset first tokens including: (i) the second set of digital asset addresses, each respective digital asset address of the second set of digital asset addresses in the distributed transaction ledger in the form of the blockchain maintained by the plurality of geographically distributed computer systems in the blockchain network, the second set of digital asset addresses including a second respective digital asset address for each respective digital asset first token holder; and (ii) the respective digital asset first token amount associated with each respective second digital asset address; (c) determining, by the administrator system, a respective payment amount in stable value digital asset tokens to be made to each respective digital asset address of the second set of digital asset addresses based at least in part on the first sum of stable value digital asset tokens and the respective digital asset first token amount associated with each respective digital asset address of the second set of digital asset addresses wherein the payment amount is determined on a pro rata basis with respect to a sum of the respective digital asset first token amounts for the second set of digital asset addresses; (d) generating, by the administrator system, transaction instructions to transfer the respective payment amount of stable value digital asset tokens from the designated public address to each respective digital asset address of the second set of digital asset addresses with a digital signature based on the first designated private key; (e) publishing, by the administrator system to the blockchain, the transaction instructions, wherein the plurality of geographically distributed computer systems implement the transaction instructions to transfer the respective payment amount of stable value digital asset tokens to each respective digital asset address of the second set of digital asset addresses; (f) confirming, by the administrator system, that each digital asset address of the second set of the digital asset addresses received the determined respective payment amount in stable value digital asset tokens based on reference to the blockchain and that the respective digital asset first token amount for each digital asset address of the second set of digital asset address after publishing the transaction instructions is the same as the respective digital asset first token amount for each digital asset address of the second set of digital asset address after publishing the transaction instructions.

In embodiments, the blockchain is an Ethereum blockchain.

In embodiments, the blockchain is a Bitcoin blockchain.

In embodiments, the method may further comprise: (g) notifying, by the administrator system, each digital asset address of the second set of the digital asset addresses of each respective transfer of stable value digital asset tokens to each respective digital asset address of the second set of digital asset addresses.

In embodiments, the blockchain is a Stellar blockchain.

In embodiments, the administrator is a regulated digital asset exchange.

In embodiments, the digital asset security token is a security registered with a government authority.

In embodiments, the digital asset security token is a debt security and the electronic payments are interest.

In embodiments, the digital asset security token is an equity security and the electronic payments are dividends.

In embodiments, the digital asset security token is secured by intellectual property rights and the electronic payments are royalties.

In embodiments, the blockchain is based on a mathematical protocol for proof of work.

In embodiments, the mathematical protocol is open source.

In embodiments, the blockchain is based on a mathematical protocol for proof of stake.

In embodiments, the mathematical protocol is open source.

In embodiments, the blockchain is based on a cryptographic mathematical protocol.

In embodiments, the method may further comprise a step of publishing, by the administrator system to a side ledger, the transaction instructions associated with transferring the respective payment amount of stable value digital asset tokens to each respective digital asset address of the second set of digital asset addresses and the publishing step (e) includes publishing the transaction instructions from the side ledger to the distributed asset ledger periodically or aperiodically.

In embodiments, the method may further comprise steps of: (g) receiving, at the digital asset first token issuer system, from at least one digital asset first token holder, a payment request prior to the obtaining step (a), the payment request including: (i) the digital asset address of the digital asset first token holder; and (ii) a request to transfer a payment amount of stable value digital asset tokens to the digital asset address of the digital asset first token holder; and (h) confirming, at the digital asset first token issuer system, that: (i) the digital asset address of the digital asset first token holder is valid; (ii) the digital asset first token amount of digital asset first tokens associated with the address of the digital asset first token holder is more than zero; and (iii) the digital asset first token holder is entitled to payment.

In embodiments, the digital asset first token database is maintained and stored on the plurality of geographically distributed computer systems in the blockchain network.

In embodiments, the digital asset security token database is maintained on a sidechain, separate from the blockchain network, wherein information on the sidechain is published and stored on the blockchain network periodically or aperiodically.

In embodiments, the generating step (d) includes generating, by the administrator system, transaction instructions for the first sum of stable value digital asset tokens by updating the stable value digital asset token database to reserve stable value digital asset tokens in the amount of the first sum.

In embodiments, the payment amount relates to a dividend to be paid based on ownership of each digital asset first token.

In embodiments, the payment amount relates to a royalty to be paid based on ownership of each digital asset first token.

In embodiments, the payment amount relates to interest to be paid based on ownership of each digital asset first token.

In embodiments, the blockchain network uses a byzantine fault tolerance protocol as a consensus mechanism.

In embodiments, the currency is a fiat currency.

In embodiments, the fiat currency is US dollar.

In embodiments, the fiat currency is Euro.

In embodiments, the fiat currency is Yen.

In embodiments, the fiat currency is British Pound.

In embodiments, the fiat currency is Australian dollar.

In embodiments, the fiat currency is Canadian dollar.

In embodiments, the currency is cryptocurrency.

In embodiments, the currency is a cryptocurrency.

In embodiments, the cryptocurrency is Bitcoin.

In embodiments, the cryptocurrency is Litecoin.

In embodiments, the cryptocurrency is Bitcoin Cash.

In embodiments, the cryptocurrency is Filecoin.

In embodiments, the cryptocurrency is Zcash.

In embodiments, the cryptocurrency is Stellar.

In embodiments, the cryptocurrency is Tezos.

In embodiments, the digital asset stable value tokens are issued by the stable value digital asset token issuer through one or more nodes associated with the stable value digital asset token issuer.

In embodiments, a method of issuing electronic payments using an amount of stable value digital asset tokens may comprise the steps of: (a) obtaining, by a digital asset exchange system associated with a digital asset exchange, a first sum of stable value digital asset tokens in a first designated public address associated with a blockchain, wherein the first sum of stable value digital asset tokens are backed by a second sum of currency maintained by a custodian based on a fixed ratio of the stable value digital asset token to the currency, wherein the first designated public address corresponds to a first designated public key and a corresponding first designated private key; wherein the stable value digital asset token is maintained in a stable value digital asset token database stored on a distributed transaction ledger in the form of a blockchain associated with an underlying asset maintained by a plurality of geographically distributed computer systems in a blockchain network, the stable value digital asset token database comprising a log of stable value digital asset tokens including: (i) a first set of digital asset addresses, each respective digital asset address of the first set of digital asset addresses in the distributed transaction ledger maintained by the plurality of geographically distributed computer systems in the blockchain network, the first set of digital asset addresses including a first respective digital asset token address for each respective stable value digital asset token holder; (ii) a respective stable value digital asset token amount for each first respective stable value digital asset token address associated with a respective stable value digital asset token holder, wherein the stable value digital asset tokens are issued by a stable value digital asset token issuer; (b) obtaining, by the digital asset exchange system, (A) each respective digital asset address of a second set of digital asset addresses for each respective digital asset first token holder of a plurality of digital asset first token holders; and (B) a respective digital asset first token amount associated with each respective digital asset address of the second set of digital asset addresses; from a digital asset first token database stored on a second set of one or more computer readable media, the one or more computer readable media associated with a digital asset first token issuer system associated with a digital asset first token issuer, wherein the digital asset first token database comprises a log of digital asset first tokens including: (i) the second set of digital asset addresses, each respective digital asset address of the second set of digital asset addresses in the distributed transaction ledger in the form of the blockchain maintained by the plurality of geographically distributed computer systems in the blockchain network, the second set of digital asset addresses including a second respective digital asset address for each respective digital asset first token holder; and (ii) the respective digital asset first token amount associated with each respective second digital asset address; (c) determining, by the digital asset exchange system, a respective payment amount in stable value digital asset tokens to be made to each respective digital asset address of the second set of digital asset addresses based at least in part on the first sum of stable value digital asset tokens and the respective digital asset first token amount associated with each respective digital asset address of the second set of digital asset addresses wherein the payment amount is determined on a pro rata basis with respect to a sum of the respective digital asset first token amounts for the second set of digital asset addresses; (d) generating, by the digital asset exchange system, transaction instructions to transfer the respective payment amount of stable value digital asset tokens from the designated public address to each respective digital asset address of the second set of digital asset addresses with a digital signature based on the first designated private key; (e) publishing, by the digital asset exchange system to the blockchain, the transaction instructions, wherein the plurality of geographically distributed computer systems implement the transaction instructions to transfer the respective payment amount of stable value digital asset tokens to each respective digital asset address of the second set of digital asset addresses; (f) confirming, by the digital asset exchange system, that each digital asset address of the second set of the digital asset addresses received the determined respective payment amount in stable value digital asset tokens based on reference to the blockchain and that the respective digital asset first token amount for each digital asset address of the second set of digital asset address after publishing the transaction instructions is the same as the respective digital asset first token amount for each digital asset address of the second set of digital asset address after publishing the transaction instructions.

In embodiments, the blockchain is an Ethereum blockchain.

In embodiments, the blockchain is a Bitcoin blockchain.

In embodiments, the method may further comprise: (g) notifying, by the digital asset exchange system, each digital asset address of the second set of the digital asset addresses of each respective transfer of stable value digital asset tokens to each respective digital asset address of the second set of digital asset addresses.

In embodiments, the blockchain is a Stellar blockchain.

In embodiments, the digital asset exchange is a regulated digital asset exchange.

In embodiments, the digital asset security token is a security registered with a government authority.

In embodiments, the digital asset security token is a debt security and the electronic payments are interest.

In embodiments, the digital asset security token is an equity security and the electronic payments are dividends.

In embodiments, the digital asset security token is secured by intellectual property rights and the electronic payments are royalties.

In embodiments, the blockchain is based on a mathematical protocol for proof of work.

In embodiments, the mathematical protocol is open source.

In embodiments, the blockchain is based on a mathematical protocol for proof of stake.

In embodiments, the mathematical protocol is open source.

In embodiments, the blockchain is based on a cryptographic mathematical protocol.

In embodiments, the method may further comprise a step of publishing, by the digital asset exchange system to a side ledger, the transaction instructions associated with transferring the respective payment amount of stable value digital asset tokens to each respective digital asset address of the second set of digital asset addresses and the publishing step (e) includes publishing the transaction instructions from the side ledger to the distributed asset ledger periodically or aperiodically.

In embodiments, the method may further comprise steps of: (g) receiving, at the digital asset first token issuer system, from at least one digital asset first token holder, a payment request prior to the obtaining step (a), the payment request including: (i) the digital asset address of the digital asset first token holder; and (ii) a request to transfer a payment amount of stable value digital asset tokens to the digital asset address of the digital asset first token holder; and (h) confirming, at the digital asset first token issuer system, that: (i) the digital asset address of the digital asset first token holder is valid; (ii) the digital asset first token amount of digital asset first tokens associated with the address of the digital asset first token holder is more than zero; and (iii) the digital asset first token holder is entitled to payment.

In embodiments, the digital asset first token database is maintained and stored on the plurality of geographically distributed computer systems in the blockchain network.

In embodiments, the digital asset security token database is maintained on a sidechain, separate from the blockchain network, wherein information on the sidechain is published and stored on the blockchain network periodically or aperiodically.

In embodiments, the generating step (d) includes generating, by the digital asset exchange system, transaction instructions for the first sum of stable value digital asset tokens by updating the stable value digital asset token database to reserve stable value digital asset tokens in the amount of the first sum.

In embodiments, the payment amount relates to a dividend to be paid based on ownership of each digital asset first token.

In embodiments, the payment amount relates to a royalty to be paid based on ownership of each digital asset first token.

In embodiments, the payment amount relates to interest to be paid based on ownership of each digital asset first token.

In embodiments, the blockchain network uses a byzantine fault tolerance protocol as a consensus mechanism.

In embodiments, the currency is a fiat currency.

In embodiments, the fiat currency is US dollar.

In embodiments, the fiat currency is Euro.

In embodiments, the fiat currency is Yen.

In embodiments, the fiat currency is British Pound.

In embodiments, the fiat currency is Australian dollar.

In embodiments, the fiat currency is Canadian dollar.

In embodiments, the currency is cryptocurrency.

In embodiments, the currency is a cryptocurrency.

In embodiments, the cryptocurrency is Bitcoin.

In embodiments, the cryptocurrency is Litecoin.

In embodiments, the cryptocurrency is Bitcoin Cash.

In embodiments, the cryptocurrency is Filecoin.

In embodiments, the cryptocurrency is Zcash.

In embodiments, the cryptocurrency is Stellar.

In embodiments, the cryptocurrency is Tezos.

In embodiments, the digital asset stable value tokens are issued by the stable value digital asset token issuer through one or more nodes associated with the stable value digital asset token issuer.

In embodiments, a method of issuing electronic payments using an amount of stable value digital asset tokens mat comprise the steps of: (a) obtaining, by a digital asset token issuer system associated with a digital asset token issuer, a first sum of stable value digital asset tokens in a first designated public address associated with a blockchain, wherein the first sum of stable value digital asset tokens are backed by a second sum of currency maintained by a custodian based on a fixed ratio of the stable value digital asset token to the currency, wherein the first designated public address corresponds to a first designated public key and a corresponding first designated private key; wherein the stable value digital asset token is maintained in a stable value digital asset token database stored on a distributed transaction ledger in the form of a blockchain associated with an underlying asset maintained by a plurality of geographically distributed computer systems in a blockchain network, the stable value digital asset token database comprising a log of stable value digital asset tokens including: (i) a first set of digital asset addresses, each respective digital asset address of the first set of digital asset addresses in the distributed transaction ledger maintained by the plurality of geographically distributed computer systems in the blockchain network, the first set of digital asset addresses including a first respective digital asset token address for each respective stable value digital asset token holder; (ii) a respective stable value digital asset token amount for each first respective stable value digital asset token address associated with a respective stable value digital asset token holder, wherein the stable value digital asset tokens are issued by a stable value digital asset token issuer; (b)

obtaining, by the digital asset token issuer system, (A) each respective digital asset address of a second set of digital asset addresses for each respective digital asset first token holder of a plurality of digital asset first token holders; and (B) a respective digital asset first token amount associated with each respective digital asset address of the second set of digital asset addresses; from a digital asset first token database stored on a second set of one or more computer readable media, the one or more computer readable media associated with a digital asset first token issuer system associated with a digital asset first token issuer, wherein the digital asset first token database comprises a log of digital asset first tokens including: (i) the second set of digital asset addresses, each respective digital asset address of the second set of digital asset addresses in the distributed transaction ledger in the form of the blockchain maintained by the plurality of geographically distributed computer systems in the blockchain network, the second set of digital asset addresses including a second respective digital asset address for each respective digital asset first token holder; and (ii) the respective digital asset first token amount associated with each respective second digital asset address; (c) determining, by the digital asset token issuer system, a respective payment amount in stable value digital asset tokens to be made to each respective digital asset address of the second set of digital asset addresses based at least in part on the first sum of stable value digital asset tokens and the respective digital asset first token amount associated with each respective digital asset address of the second set of digital asset addresses wherein the payment amount is determined on a pro rata basis with respect to a sum of the respective digital asset first token amounts for the second set of digital asset addresses; (d) generating, by the digital asset token issuer system, transaction instructions to transfer the respective payment amount of stable value digital asset tokens from the designated public address to each respective digital asset address of the second set of digital asset addresses with a digital signature based on the first designated private key; (e) publishing, by the digital asset token issuer to the blockchain, the transaction instructions, wherein the plurality of geographically distributed computer systems implement the transaction instructions to transfer the respective payment amount of stable value digital asset tokens to each respective digital asset address of the second set of digital asset addresses; (f) confirming, by the digital asset token issuer system, that each digital asset address of the second set of the digital asset addresses received the determined respective payment amount in stable value digital asset tokens based on reference to the blockchain and that the respective digital asset first token amount for each digital asset address of the second set of digital asset address after publishing the transaction instructions is the same as the respective digital asset first token amount for each digital asset address of the second set of digital asset address after publishing the transaction instructions.

In embodiments, the blockchain is an Ethereum blockchain.

In embodiments, the blockchain is a Bitcoin blockchain.

In embodiments, the method may further comprise: (g) notifying, by the digital asset token issuer system, each digital asset address of the second set of the digital asset addresses of each respective transfer of stable value digital asset tokens to each respective digital asset address of the second set of digital asset addresses.

In embodiments, the blockchain is a Stellar blockchain.

In embodiments, the digital asset token issuer is a regulated digital asset exchange.

In embodiments, the digital asset security token is a security registered with a government authority.

In embodiments, the digital asset security token is a debt security and the electronic payments are interest.

In embodiments, the digital asset security token is an equity security and the electronic payments are dividends.

In embodiments, the digital asset security token is secured by intellectual property rights and the electronic payments are royalties.

In embodiments, the blockchain is based on a mathematical protocol for proof of work.

In embodiments, the mathematical protocol is open source.

In embodiments, the blockchain is based on a mathematical protocol for proof of stake.

In embodiments, the mathematical protocol is open source.

In embodiments, the blockchain is based on a cryptographic mathematical protocol.

In embodiments, the method may further comprise a step of publishing, by the digital asset token issuer system to a side ledger, the transaction instructions associated with transferring the respective payment amount of stable value digital asset tokens to each respective digital asset address of the second set of digital asset addresses and the publishing step (e) includes publishing the transaction instructions from the side ledger to the distributed asset ledger periodically or aperiodically.

In embodiments, method may further comprise the steps of: (g) receiving, at the digital asset first token issuer system, from at least one digital asset first token holder, a payment request prior to the obtaining step (a), the payment request including: (i) the digital asset address of the digital asset first token holder; and (ii) a request to transfer a payment amount of stable value digital asset tokens to the digital asset address of the digital asset first token holder; and (h) confirming, at the digital asset first token issuer system, that: (i) the digital asset address of the digital asset first token holder is valid; (ii) the digital asset first token amount of digital asset first tokens associated with the address of the digital asset first token holder is more than zero; and (iii) the digital asset first token holder is entitled to payment.

In embodiments, the digital asset first token database is maintained and stored on the plurality of geographically distributed computer systems in the blockchain network.

In embodiments, the digital asset security token database is maintained on a sidechain, separate from the blockchain network, wherein information on the sidechain is published and stored on the blockchain network periodically or aperiodically.

In embodiments, the generating step (d) includes generating, by the digital asset token issuer system, transaction instructions for the first sum of stable value digital asset tokens by updating the stable value digital asset token database to reserve stable value digital asset tokens in the amount of the first sum.

In embodiments, the payment amount relates to a dividend to be paid based on ownership of each digital asset first token.

In embodiments, the payment amount relates to a royalty to be paid based on ownership of each digital asset first token.

In embodiments, the payment amount relates to interest to be paid based on ownership of each digital asset first token.

In embodiments, the blockchain network uses a byzantine fault tolerance protocol as a consensus mechanism.

In embodiments, the currency is a fiat currency.

In embodiments, the fiat currency is US dollar.

In embodiments, the fiat currency is Euro.

In embodiments, the fiat currency is Yen.

In embodiments, the fiat currency is British Pound.

In embodiments, the fiat currency is Australian dollar.

In embodiments, the fiat currency is Canadian dollar.

In embodiments, the currency is cryptocurrency.

In embodiments, the currency is a cryptocurrency.

In embodiments, the cryptocurrency is Bitcoin.

In embodiments, the cryptocurrency is Litecoin.

In embodiments, the cryptocurrency is Bitcoin Cash.

In embodiments, the cryptocurrency is Filecoin.

In embodiments, the cryptocurrency is Zcash.

In embodiments, the cryptocurrency is Stellar.

In embodiments, the cryptocurrency is Tezos.

In embodiments, the digital asset stable value tokens are issued by the stable value digital asset token issuer through one or more nodes associated with the stable value digital asset token issuer.

BRIEF DESCRIPTION OF THE DRAWINGS

Exemplary embodiments of the present invention will be described with references to the accompanying figures, wherein:

FIGS. 7C-7E are an exemplary schematic diagram and a corresponding flow chart of a process for digital asset exchange customer account fiat funding via a customer-initiated request in accordance with exemplary embodiments of the present invention;

FIGS. 11A-1-11A-4 illustrate an exemplary embodiment of a dashboard fiat interface which allows registered users to deposit and/or withdraw fiat with the digital asset exchange in accordance with exemplary embodiments of the present invention;

FIGS. 11B-1-11B-4 illustrate an exemplary dashboard digital asset interface which allows registered users to deposit and/or withdrawal digital assets with the digital asset exchange system in accordance with exemplary embodiments of the present invention;

FIGS. 11C-1-11C-2 illustrate an exemplary dashboard SVCoin interface which allows registered users to purchase and/or redeem SVCoins for fiat or digital with the digital asset exchange system in accordance with exemplary embodiments of the present invention;

FIG. 12A illustrates another exemplary flow chart reflecting an exemplary embodiment where a Security Token issuer initiates a transfer of SVCoins to Security Token holders in accordance with exemplary embodiments of the present invention;

FIGS. 14A-14G, 14A-1, and 14D-1 are flow charts that illustrate exemplary processes reflecting an exemplary embodiment of a method of issuing a stable value digital asset token in accordance with exemplary embodiments of the present invention;

FIGS. 16C and 16-C1 are exemplary flowcharts of a process for obtaining a withdraw request in accordance with exemplary embodiments in the present invention;

FIGS. 17D, 17D-1, and 17E are exemplary flowcharts of a process for processing a deposit request in accordance with exemplary embodiments in the present invention;

FIG. 20A-1 is a flowchart of an exemplary process of increasing the total supply of tokens of a digital asset token using off-line keys in accordance with exemplary embodiments of the present invention;

FIG. 20B is another flowchart of an exemplary process of increasing the total supply of tokens of a digital asset token in accordance with exemplary embodiments of the present invention;

FIG. 21A is a flowchart of an exemplary process of increasing the total supply of tokens of a digital asset token in accordance with exemplary embodiments of the present invention;

FIGS. 27A-27B are exemplary graphical user interfaces (GUIs) showing exemplary published contracts in accordance with exemplary embodiments;

FIGS. 27C-27D are exemplary GUIs showing exemplary first indications of interest from user Alice in accordance with exemplary embodiments;

FIGS. 27E-27F are exemplary GUIs showing exemplary second indications of interest from user Bob in accordance with exemplary embodiments;

FIGS. 39A-39E are flow charts of processes for increasing a total supply of digital asset tokens in accordance with exemplary embodiments of the present invention;

FIGS. 49A-49C and 49C-1 are flow charts of a process for depositing fiat-backed digital asset on a digital asset security token in accordance with exemplary embodiments of the present invention;

FIGS. 59 and 59A are schematic flows of exemplary messages of various exemplary block trades in accordance with exemplary embodiments of the present invention.

FIG. 71C is an exemplary block diagram illustrating non-custodial trading information in accordance with exemplary embodiments of the present invention;

FIG. 71D is an exemplary graphical user interface being displayed on a first user device in accordance with exemplary embodiments of the present invention;

FIGS. 72A-72H are flow charts of a process for non-custodial trading on a digital asset exchange in accordance with exemplary embodiments of the present invention;

FIGS. 73A-73D are flow charts of a process for non-custodial trading on a digital asset exchange in accordance with exemplary embodiments of the present invention;

FIG. 74 is an exemplary block diagram illustrating a refund transaction request in accordance with exemplary embodiments of the present invention;

FIG. 75A is an exemplary block diagram of a dispute transaction request in accordance with exemplary embodiments of the present invention;

FIG. 75B is an exemplary block diagram of a most recent transaction request included within a dispute transaction request in accordance with exemplary embodiments of the present invention;

FIG. 76 is an exemplary is an exemplary block diagram illustrating a multiple digital asset exchanges communicating with one another via a blockchain in accordance with exemplary embodiments of the present invention;

FIG. 77A is an exemplary block diagram illustrating a first user device communicating with a smart contract for providing VPN services in accordance with exemplary embodiments of the present invention:

FIG. 77B is an exemplary block diagram illustrating a first smart contract in accordance with exemplary embodiments of the present invention;

FIG. 77C is a flow chart of a process for providing a VPN and goods and services in accordance with exemplary embodiments of the present invention;

FIG. 78A is an exemplary block diagram illustrating a first user device communicating with a smart contract for providing KYC services in accordance with exemplary embodiments of the present invention;

Figure 78A:
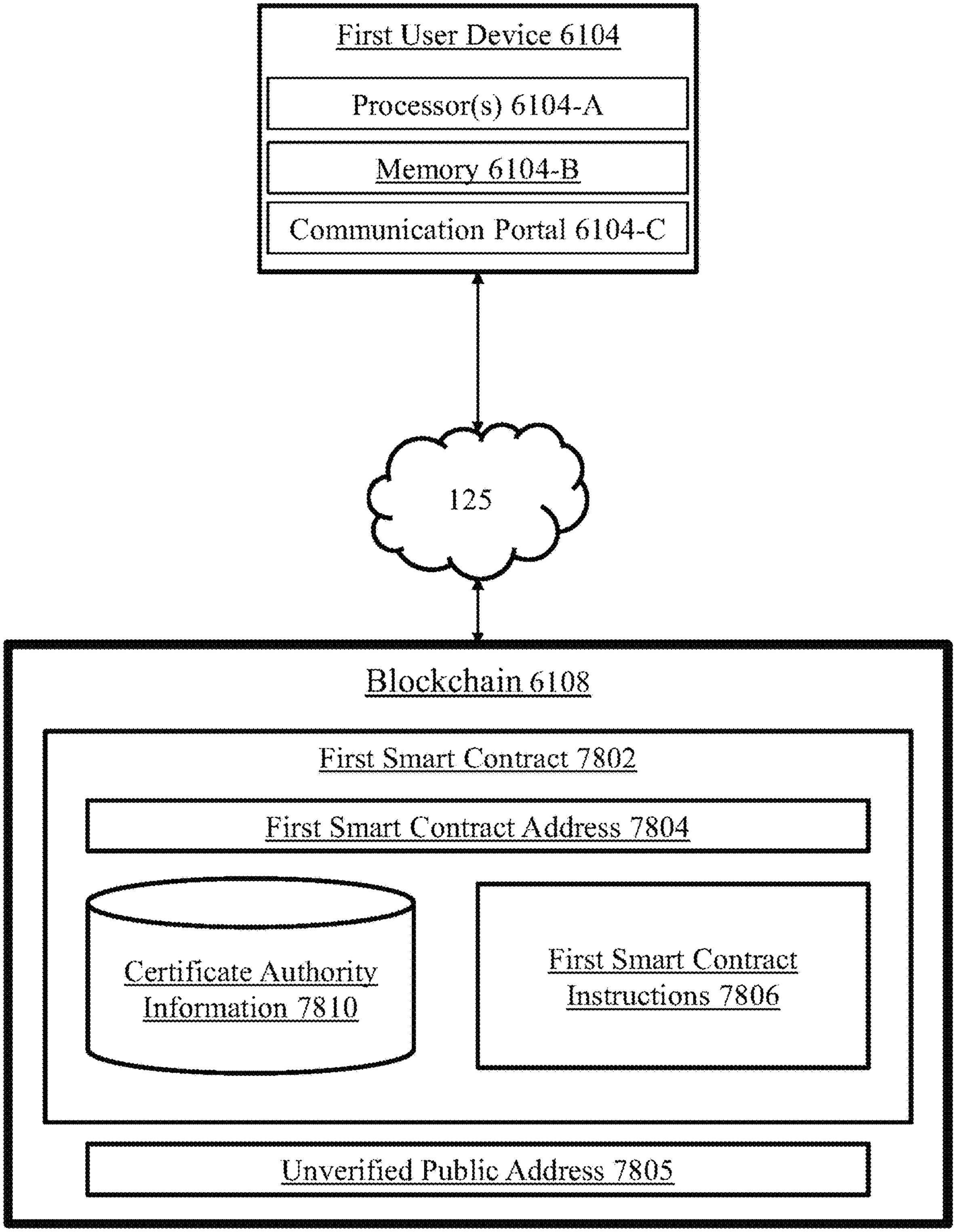
Figure 78B:
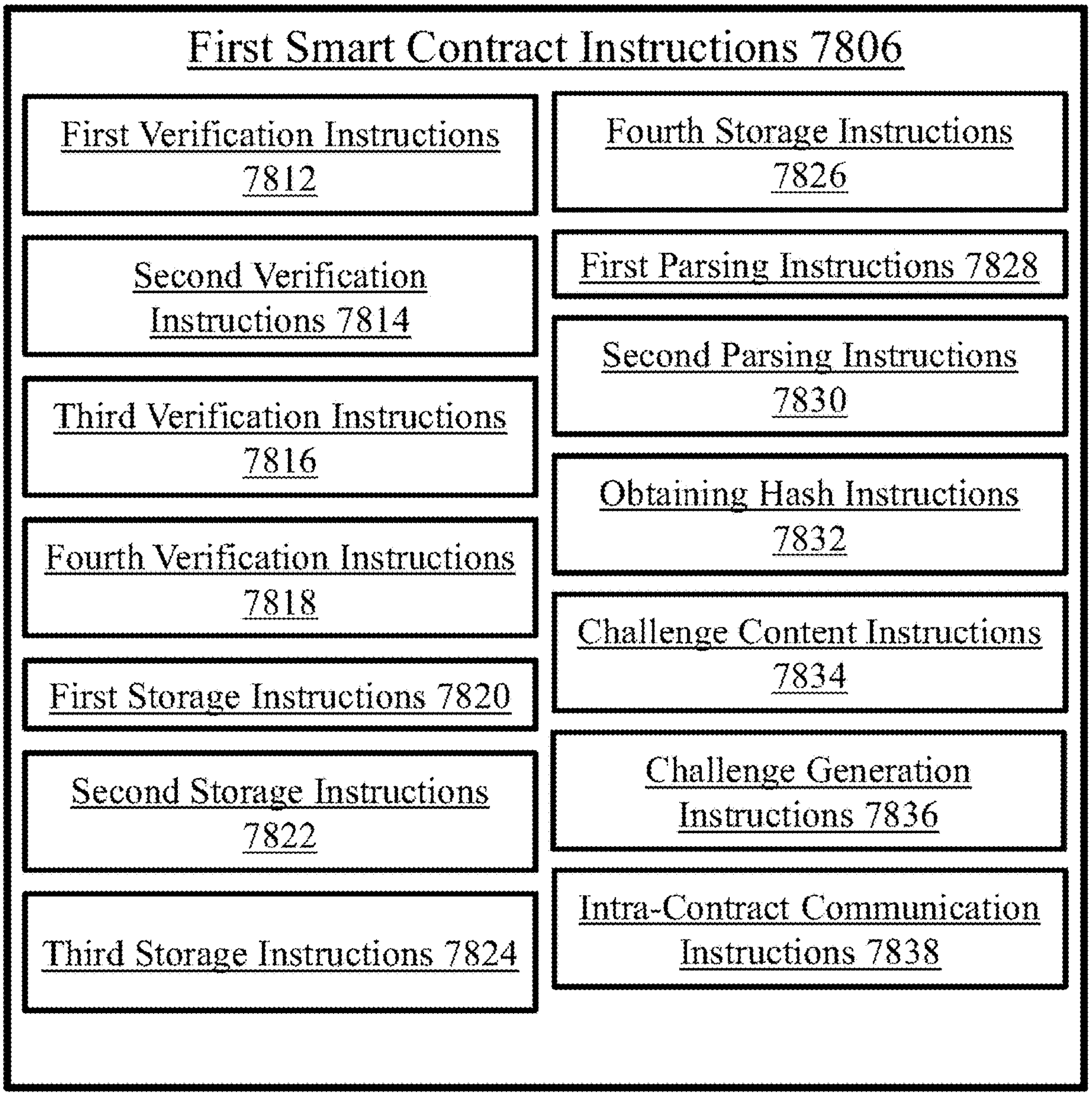
Figure 78C:
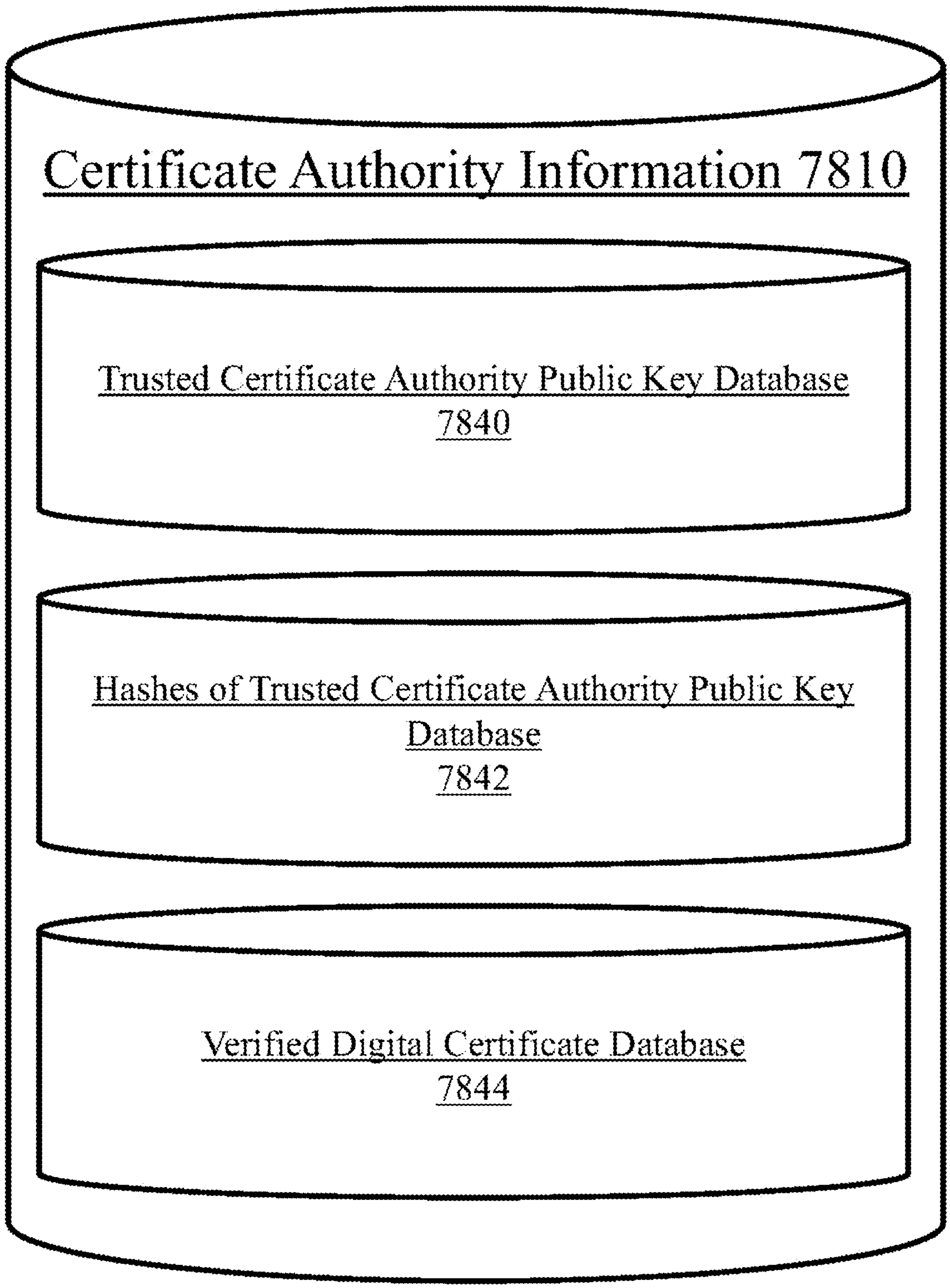
Figure 79:
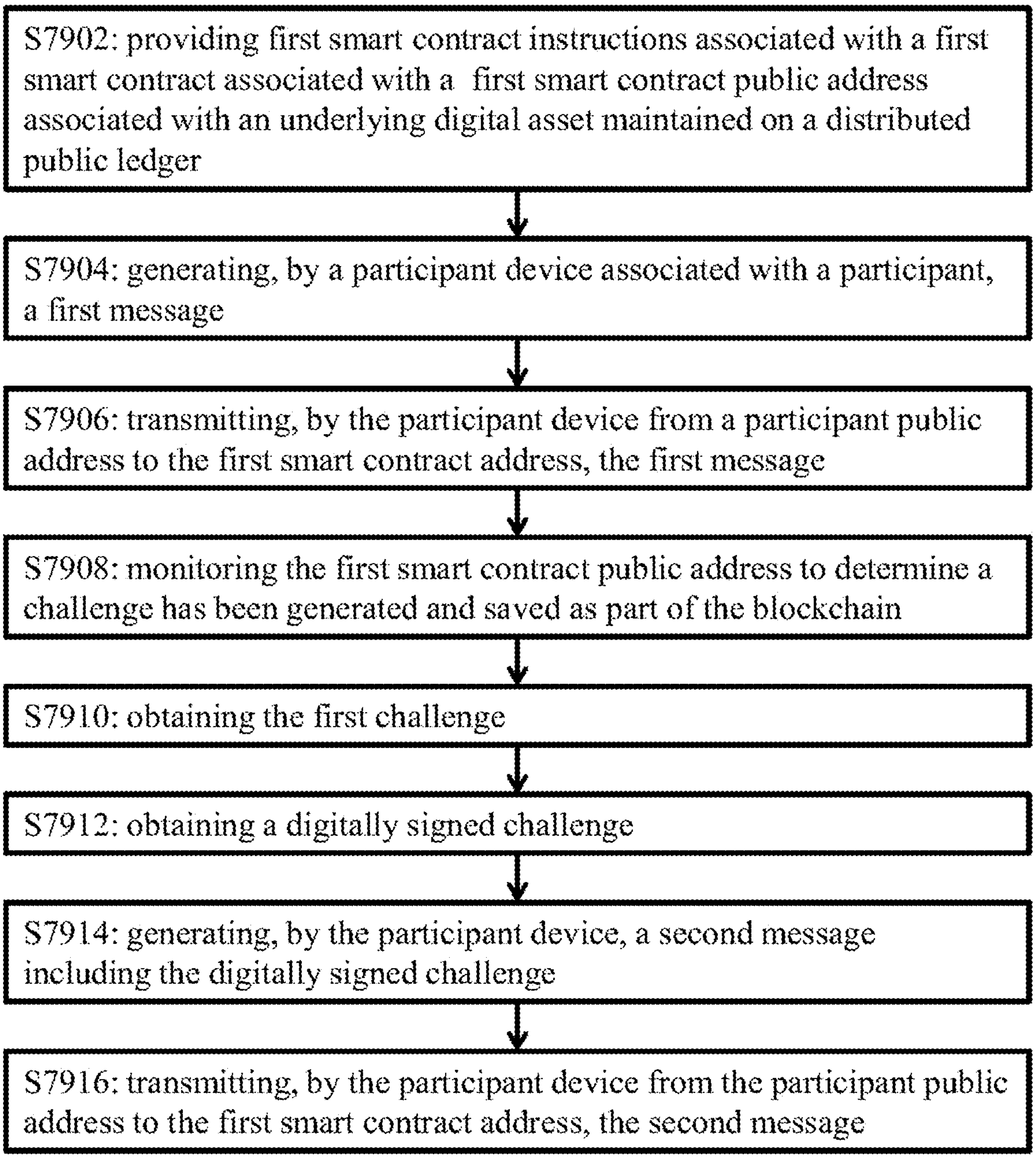

FIG. 78B is an exemplary block diagram illustrating a first smart contract in accordance with exemplary embodiments of the present invention;

FIG. 78C is an exemplary block diagram illustrating a database including certificate authority information in accordance with exemplary embodiments of the present invention; and FIG. 79 is a flow chart of a process for providing KYC in accordance with exemplary embodiments of the present invention.

Figure 80:
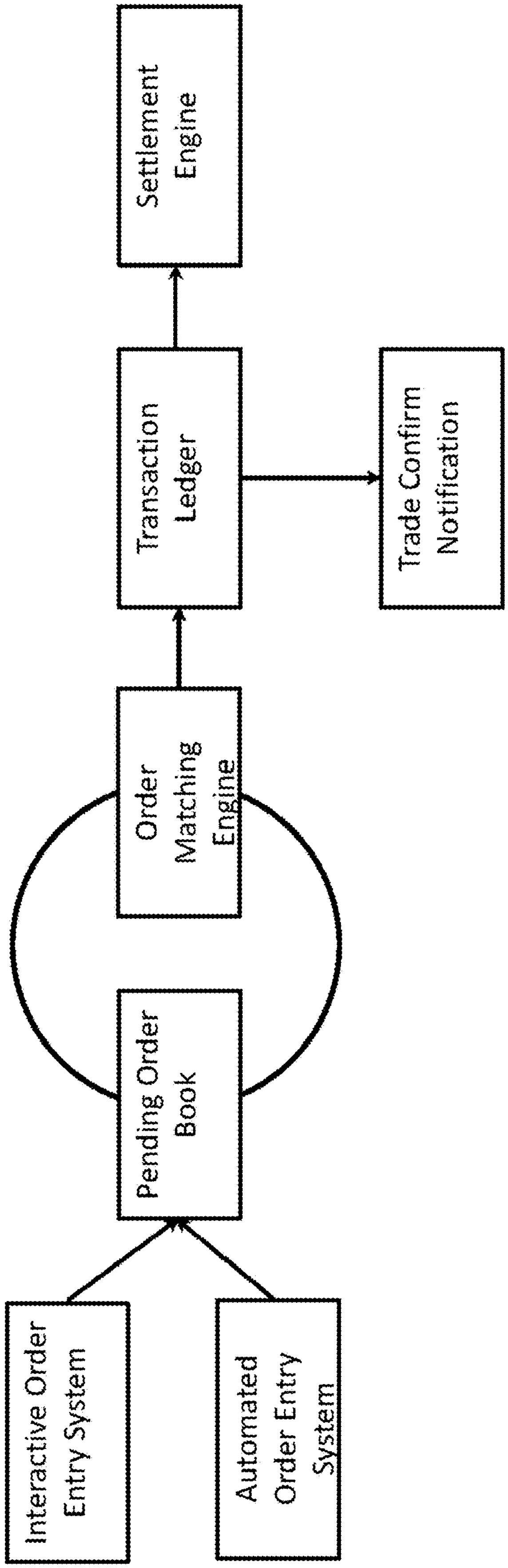
Figure 81A:
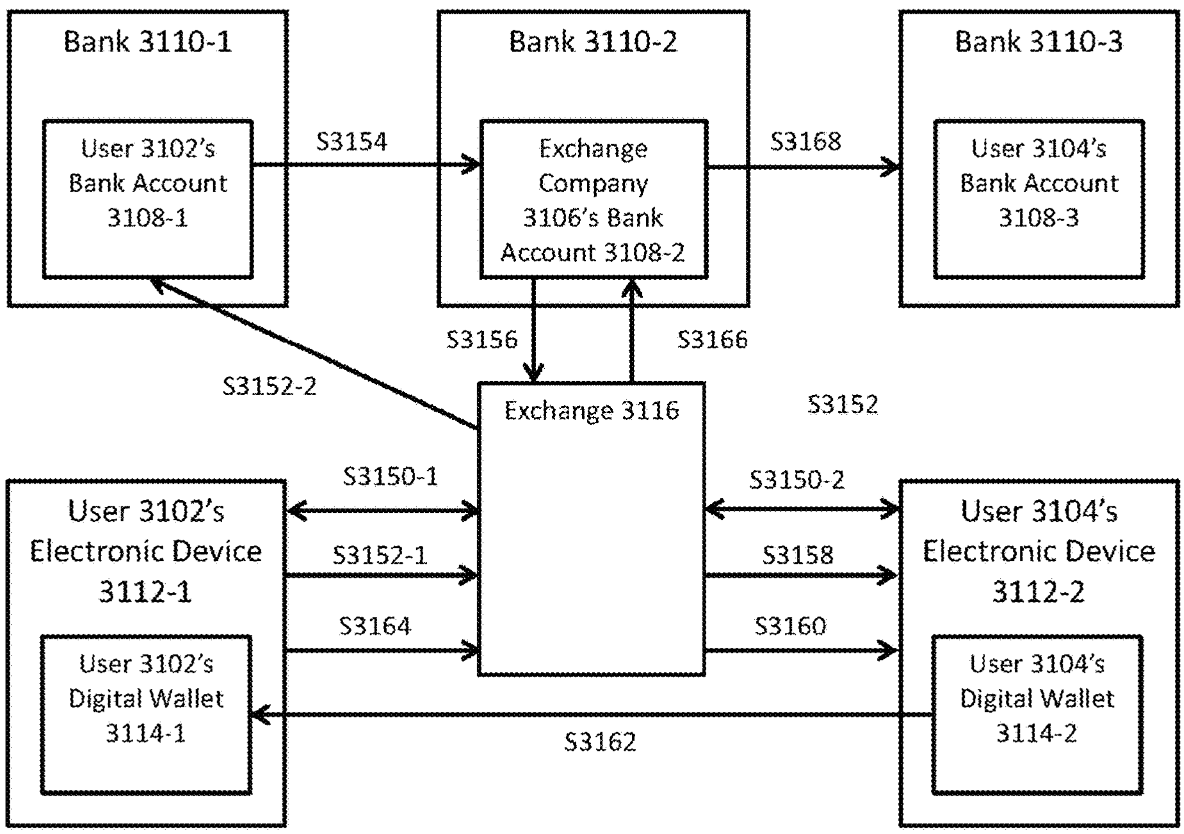
Figure 81B:
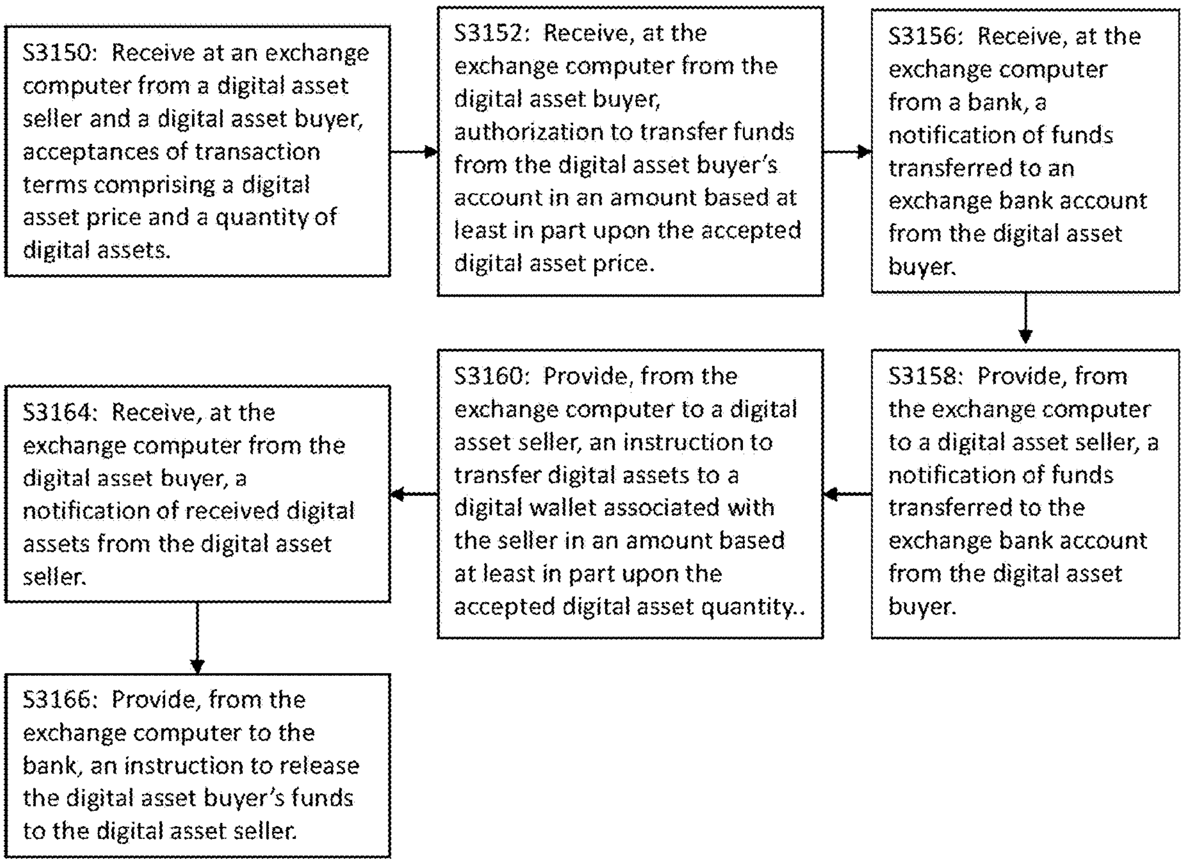
Figure 83:
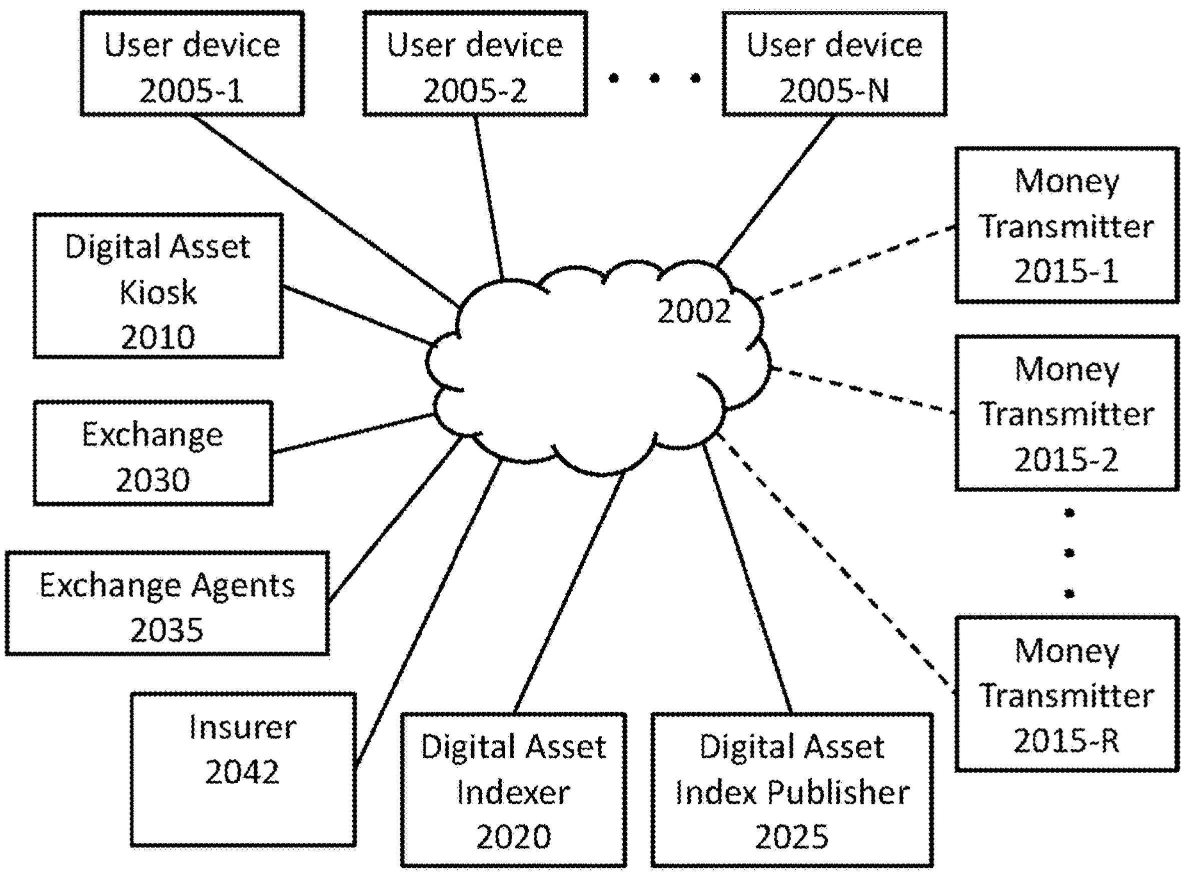
Figure 84A:
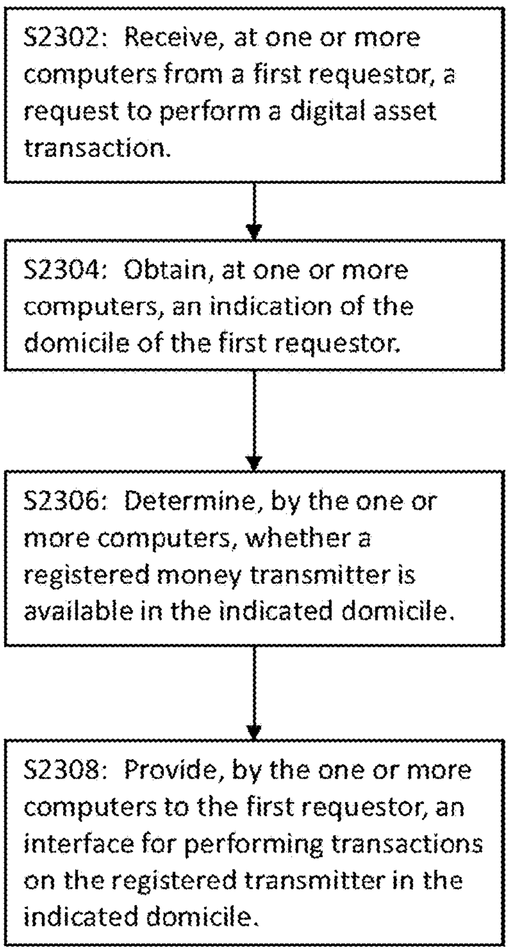
Figure 84B:
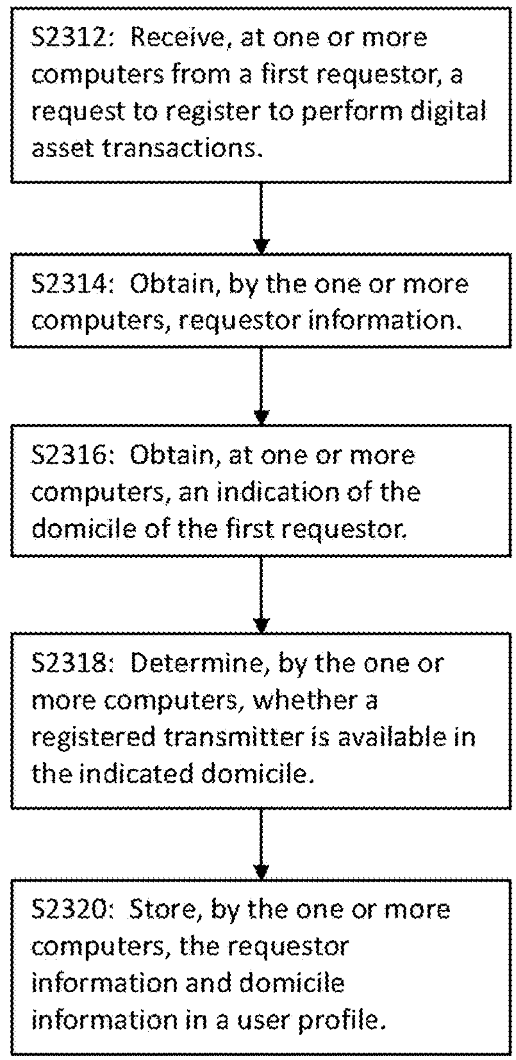
Figure 85:
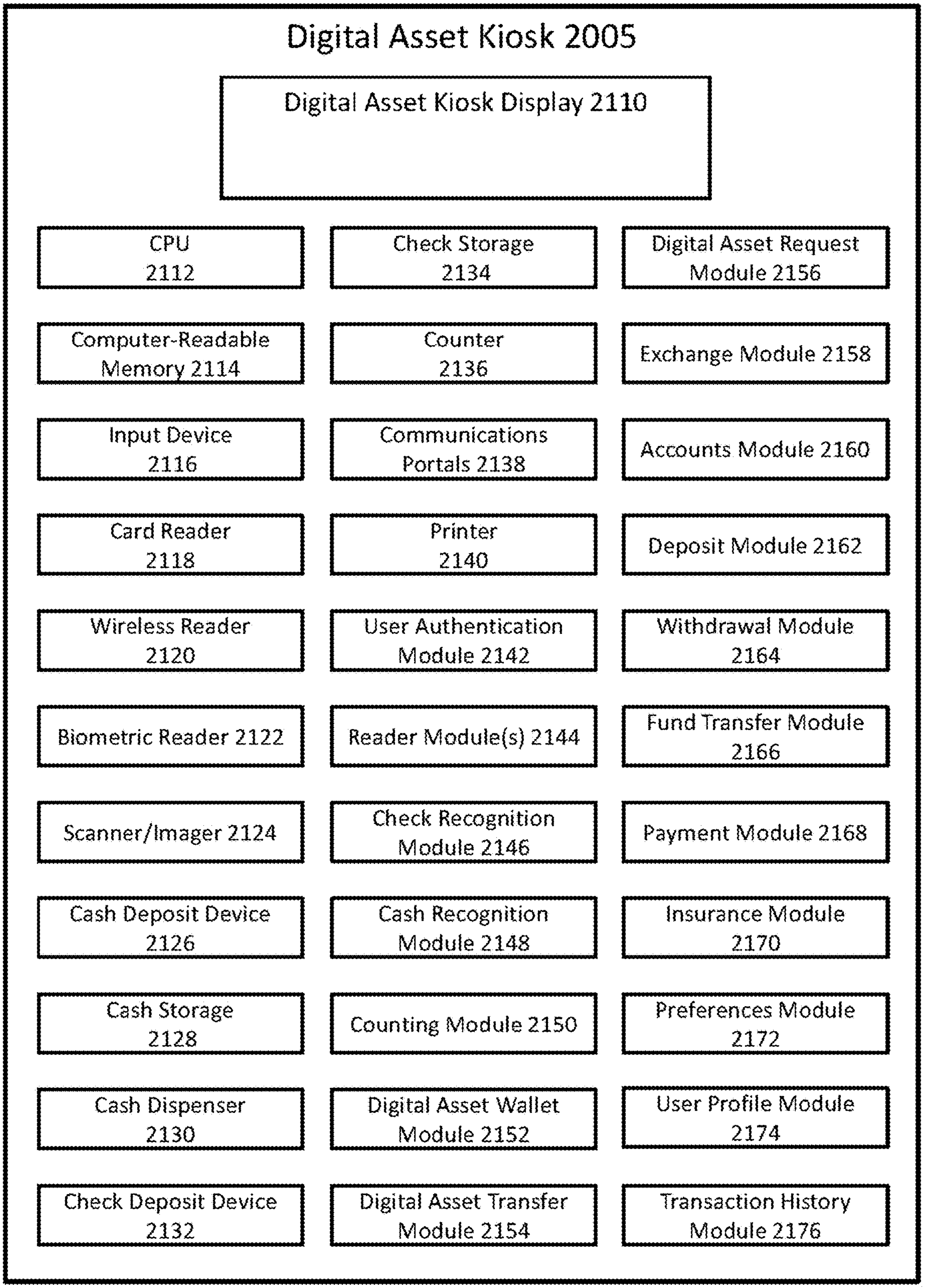
Figure 86A:
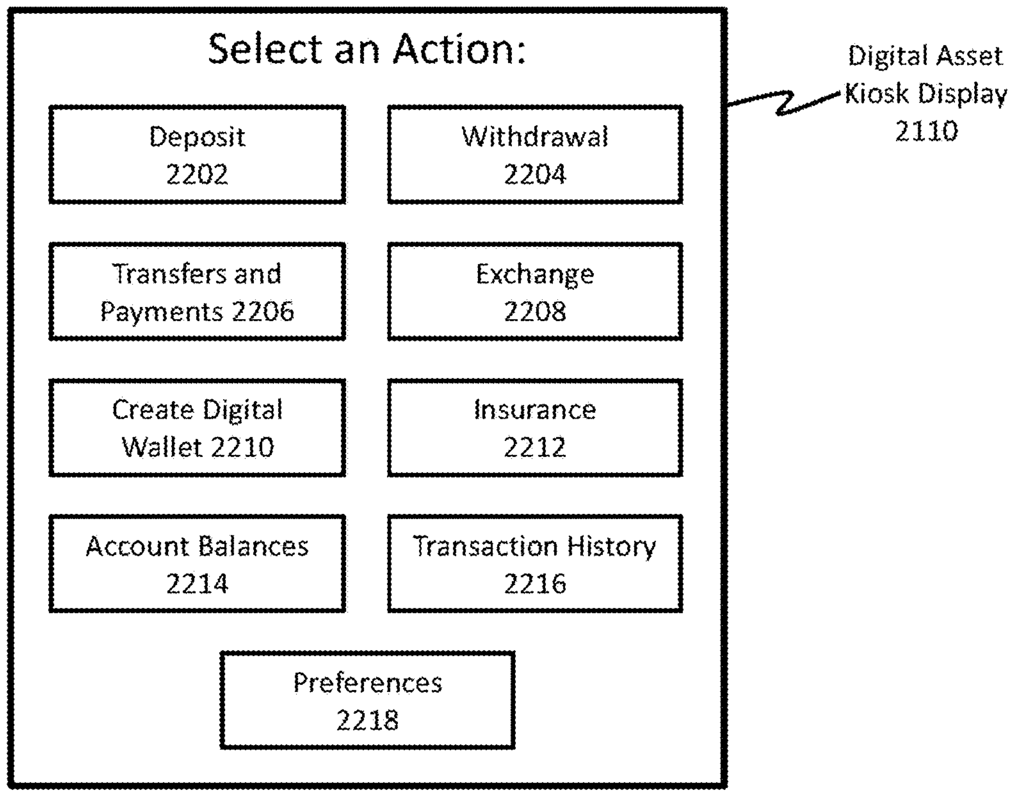
Figure 86B:
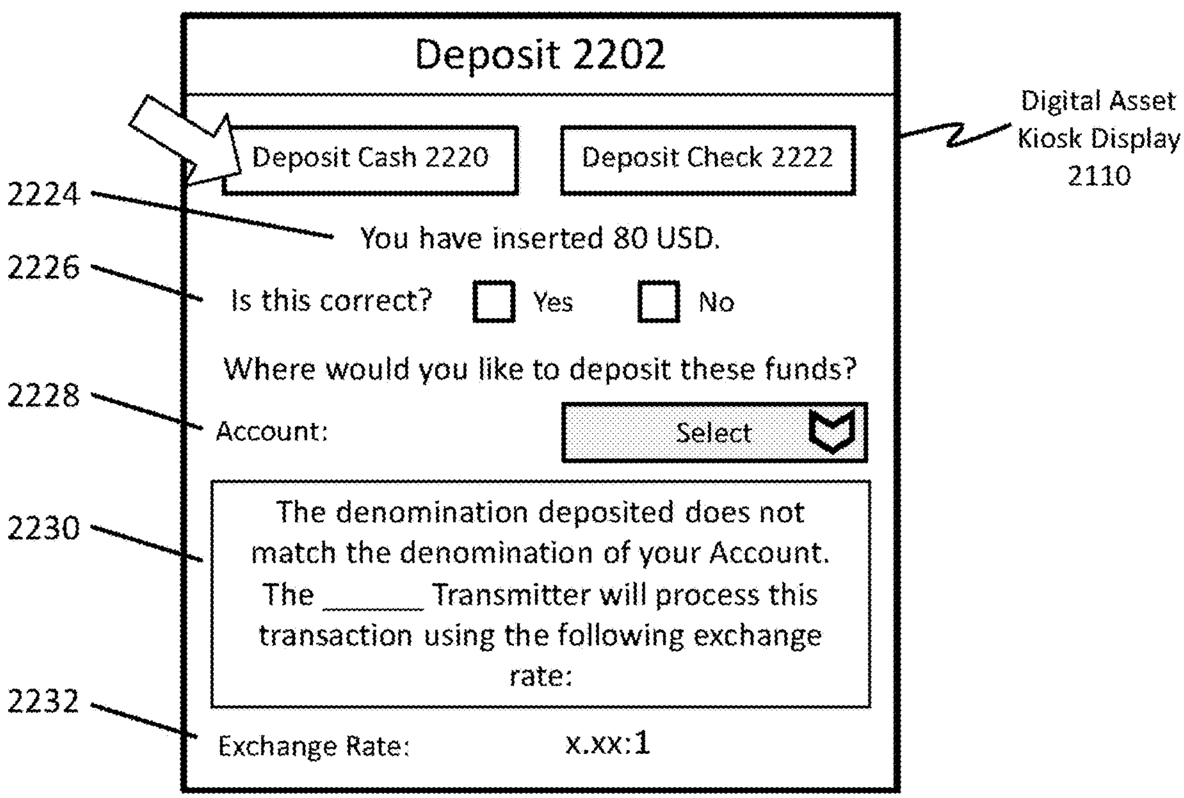
Figure 86C:
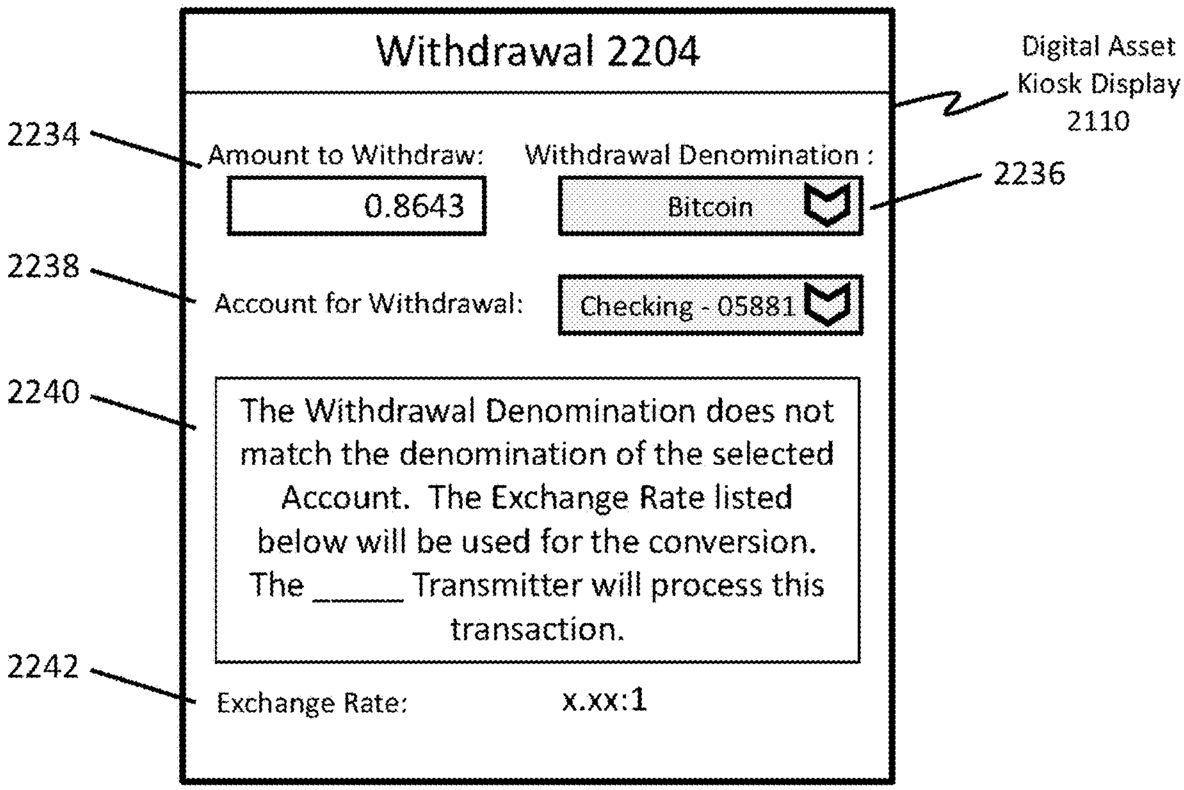
Figure 86D:
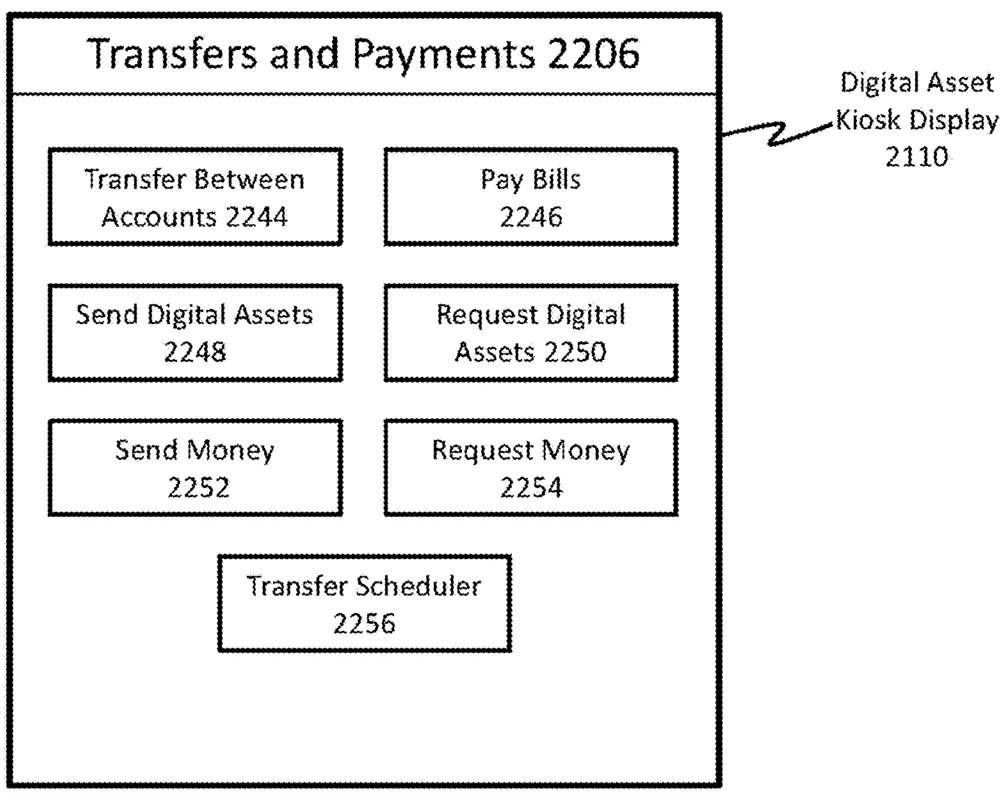
Figure 86E:
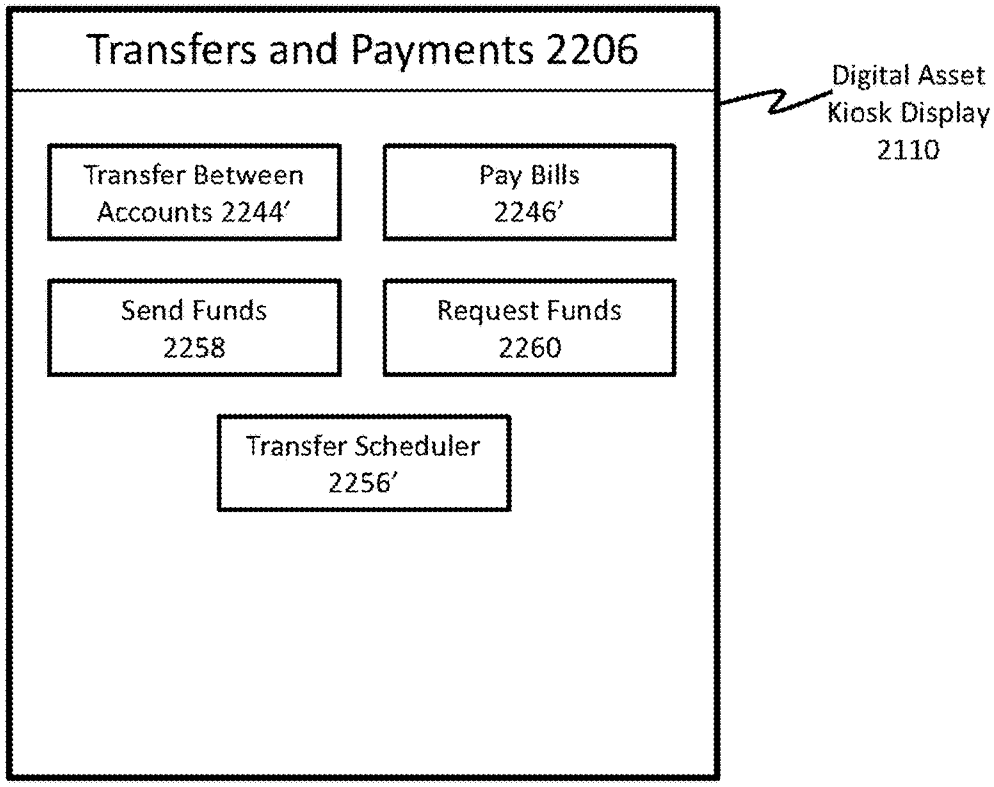
Figure 86F:
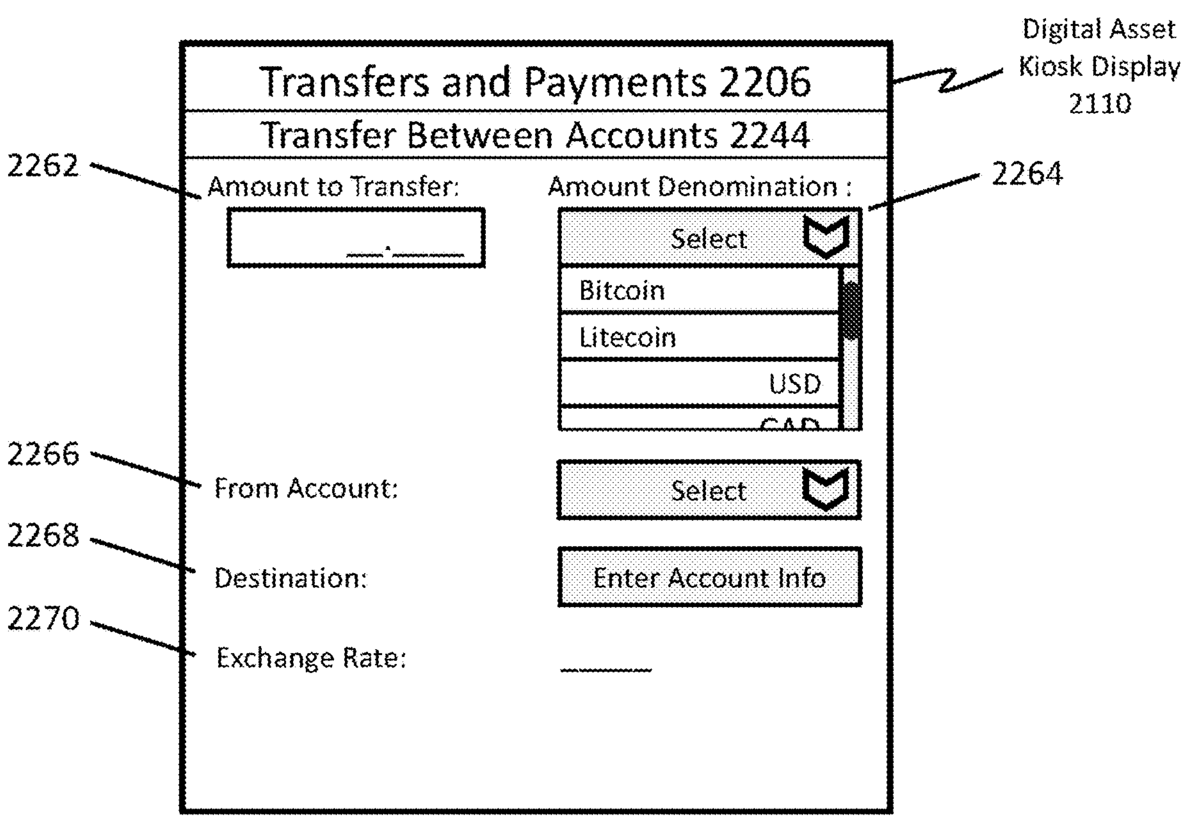
Figure 86G:
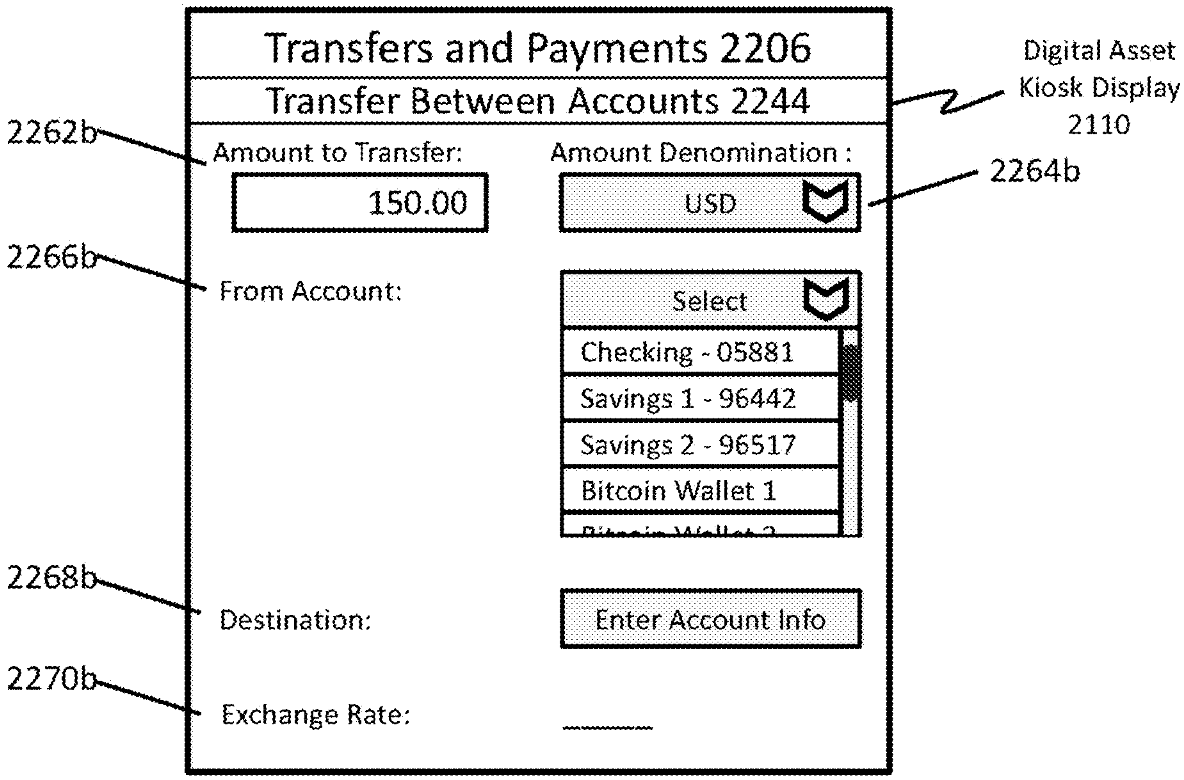
Figure 86H:
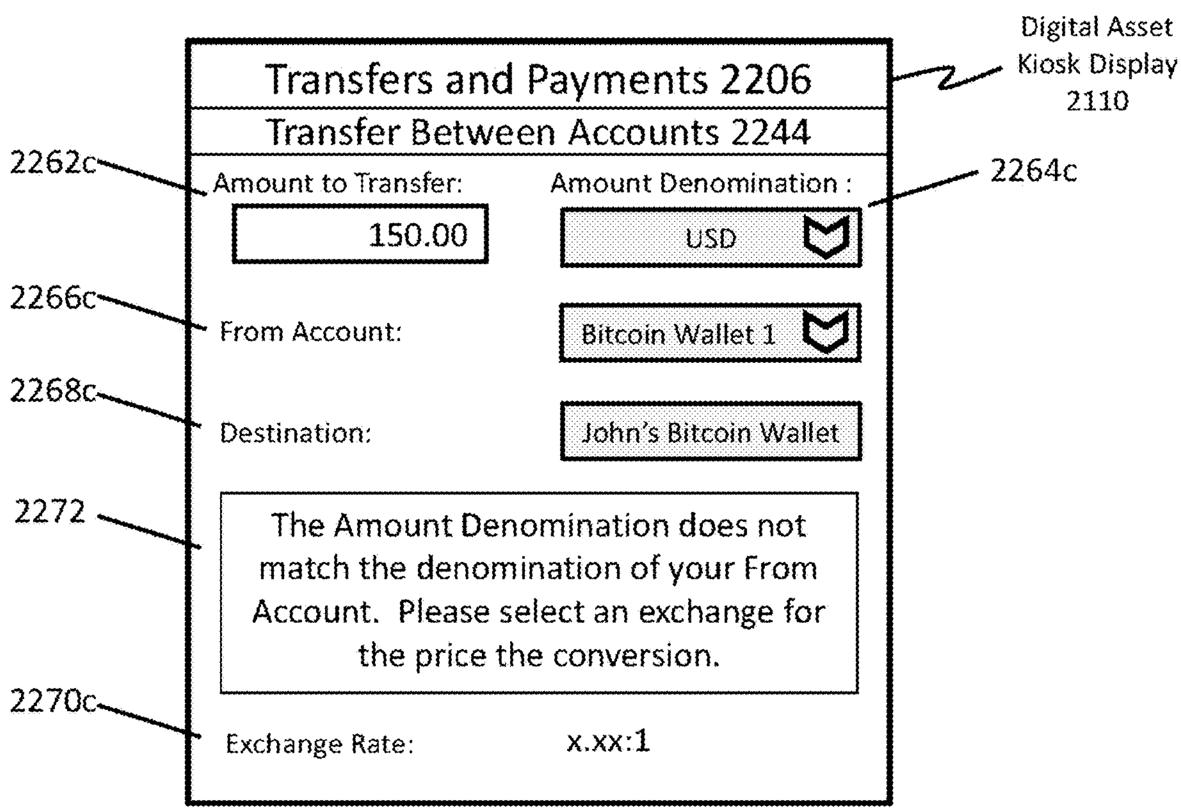
Figure 86I:
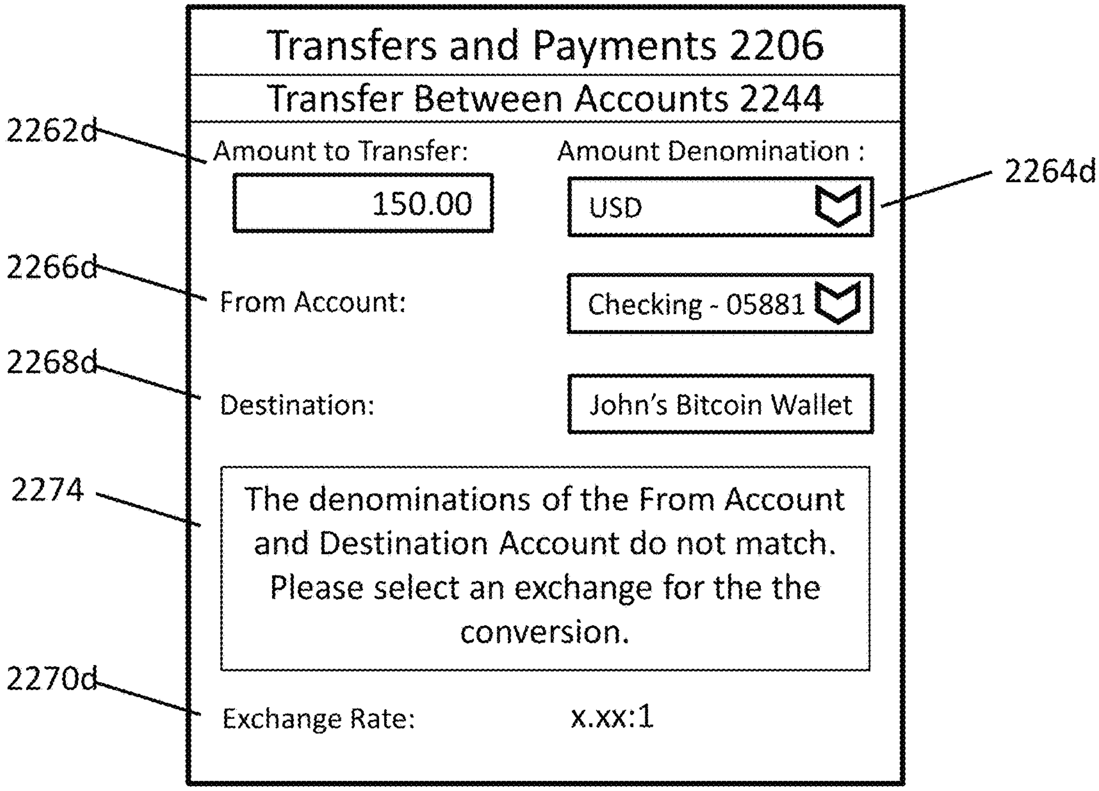
Figure 86J:
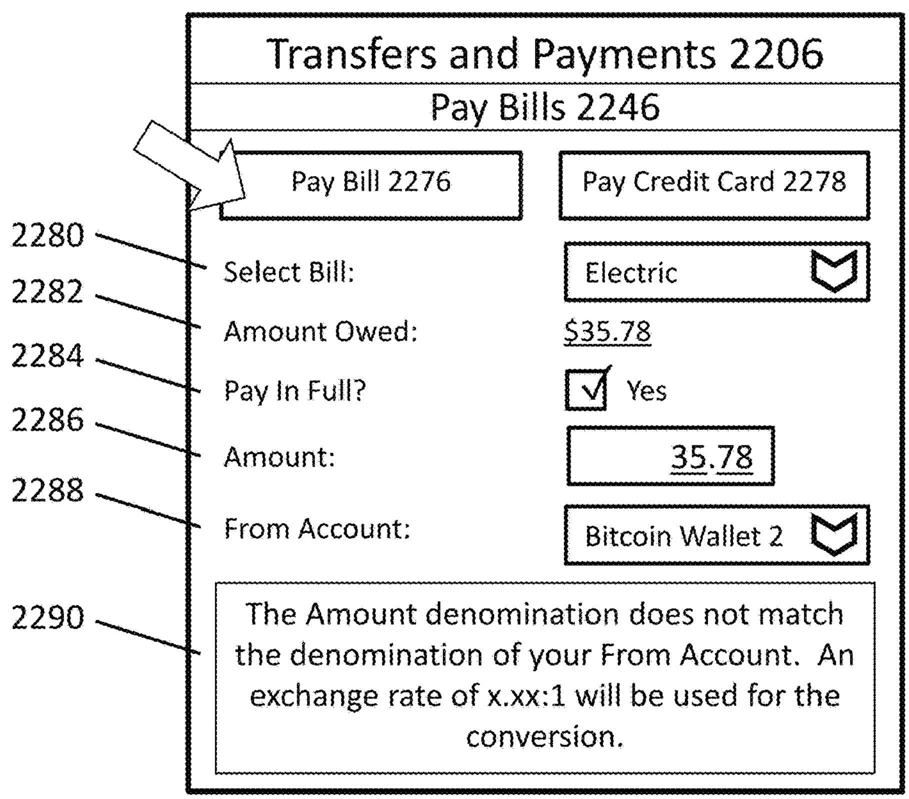
Figure 86K:
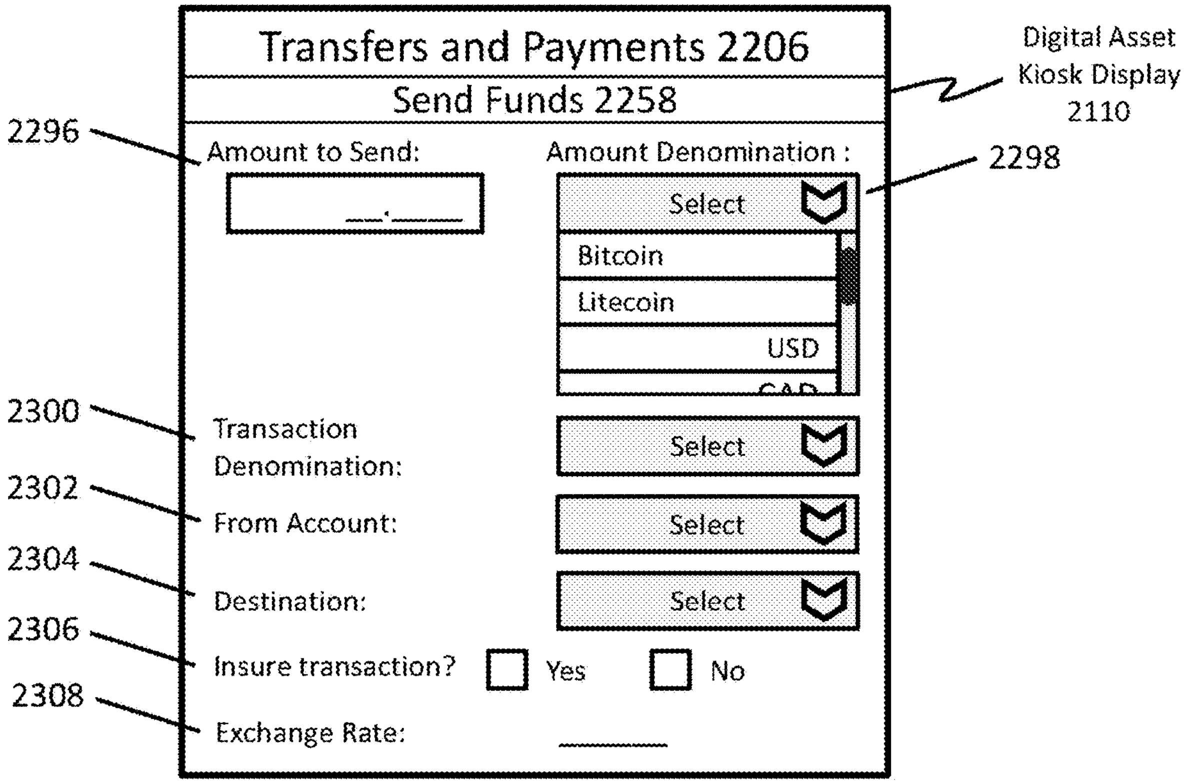
Figure 86L:
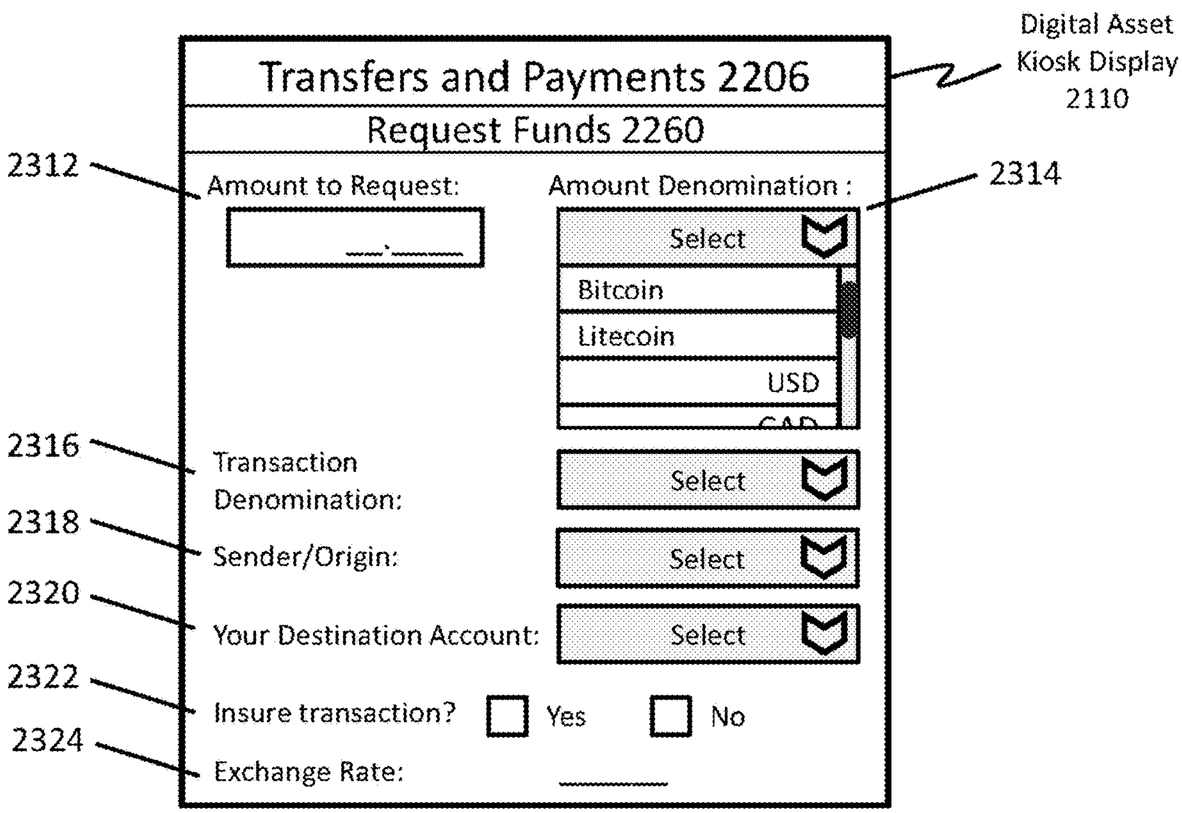
Figure 86M:
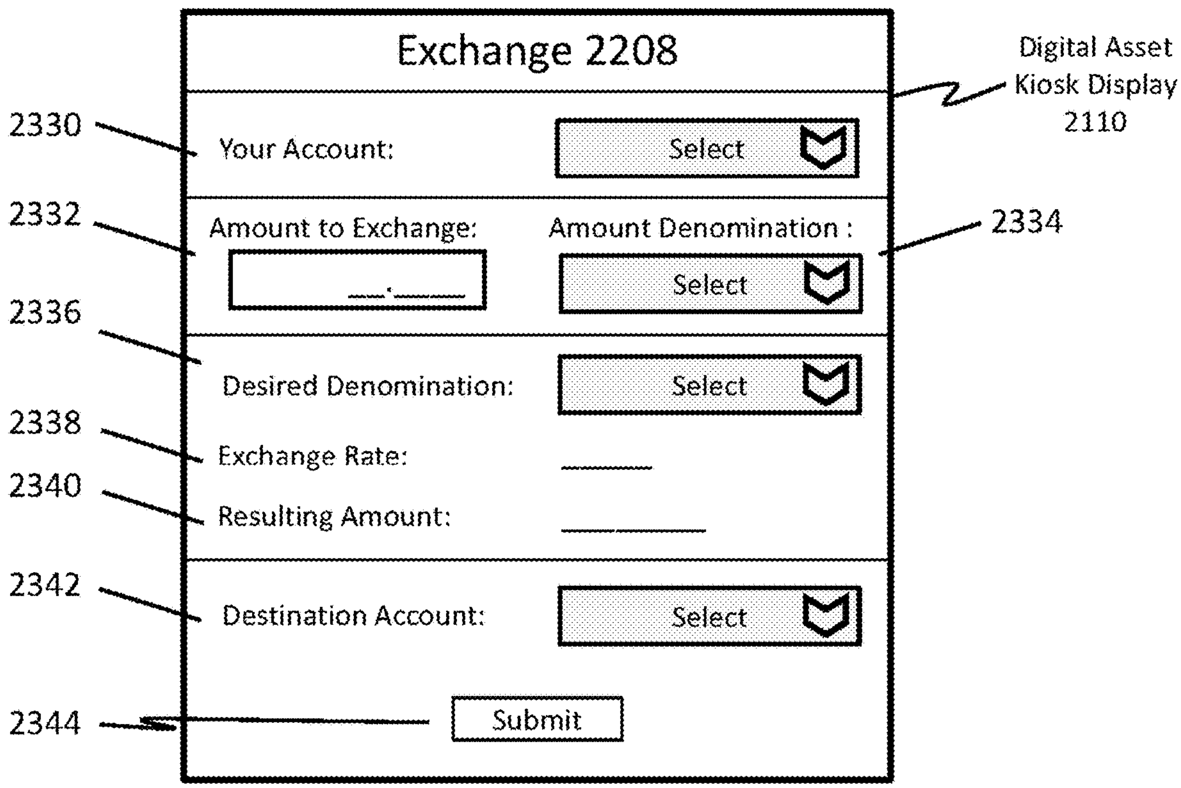
Figure 86N:
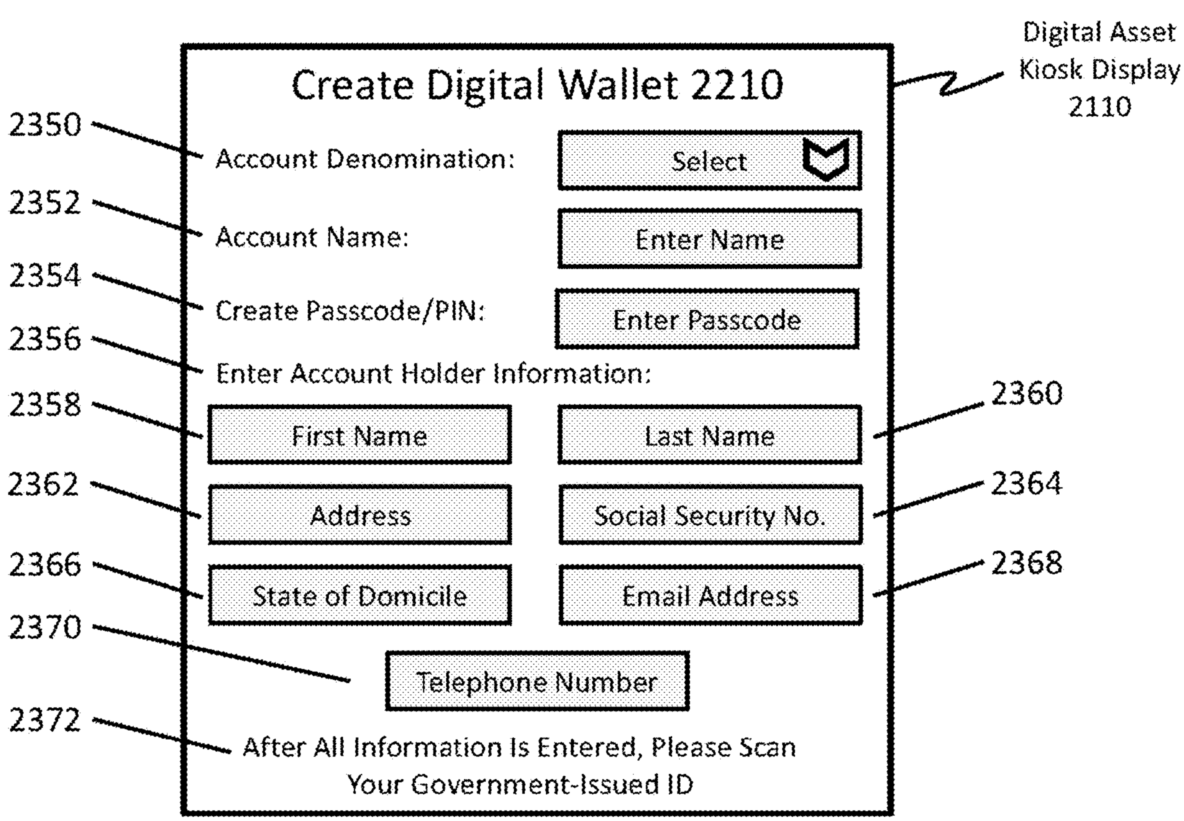
Figure 86O:
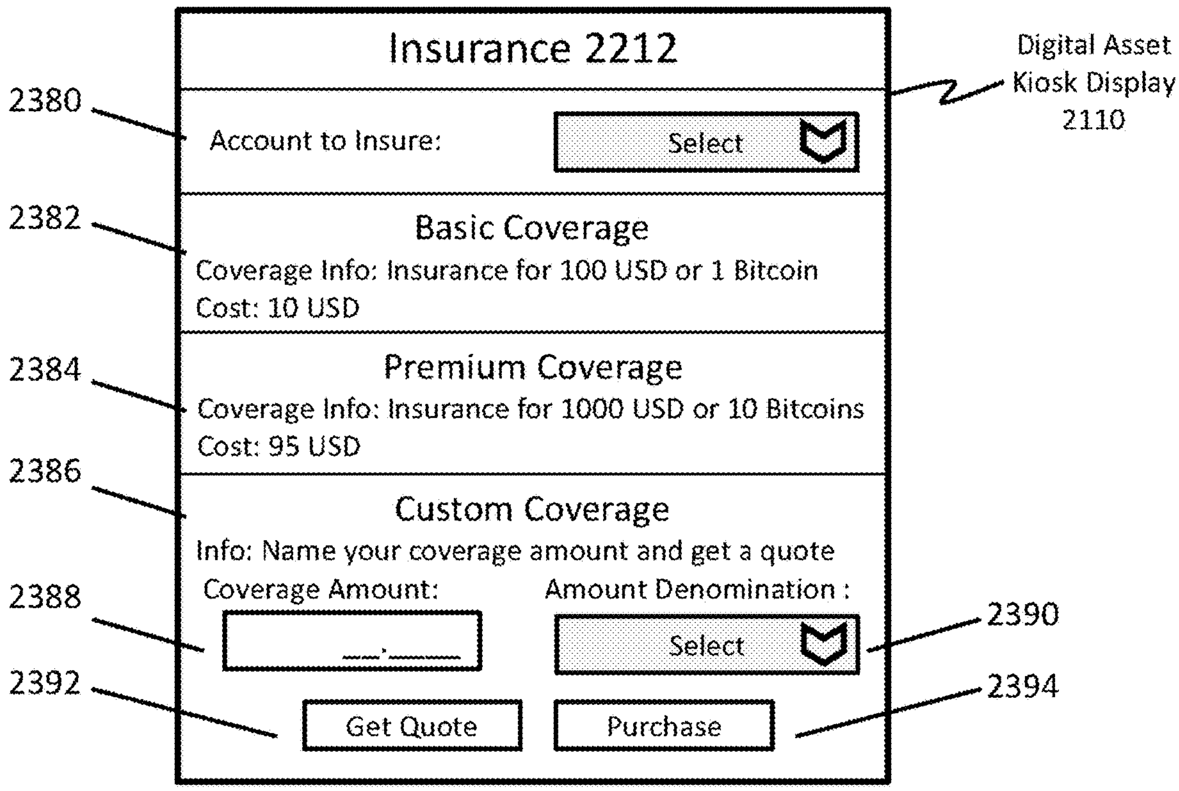
Figure 86P:
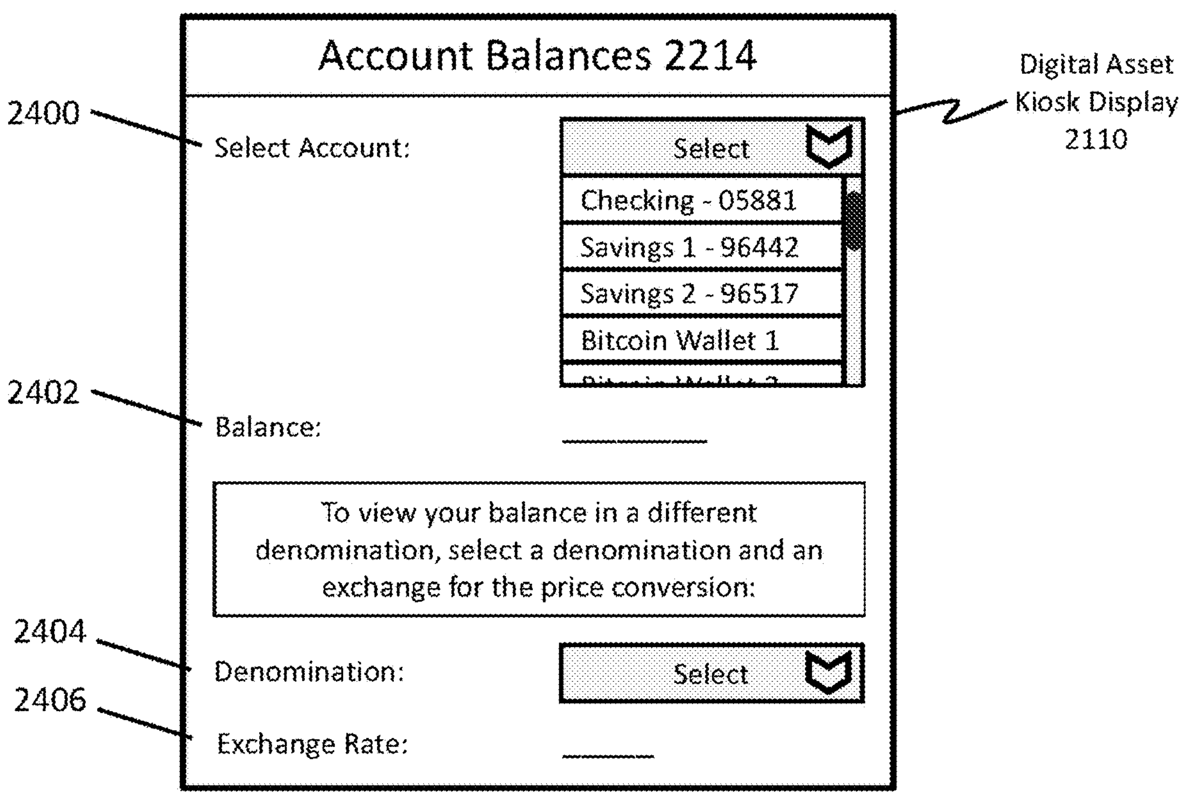
Figure 86Q:
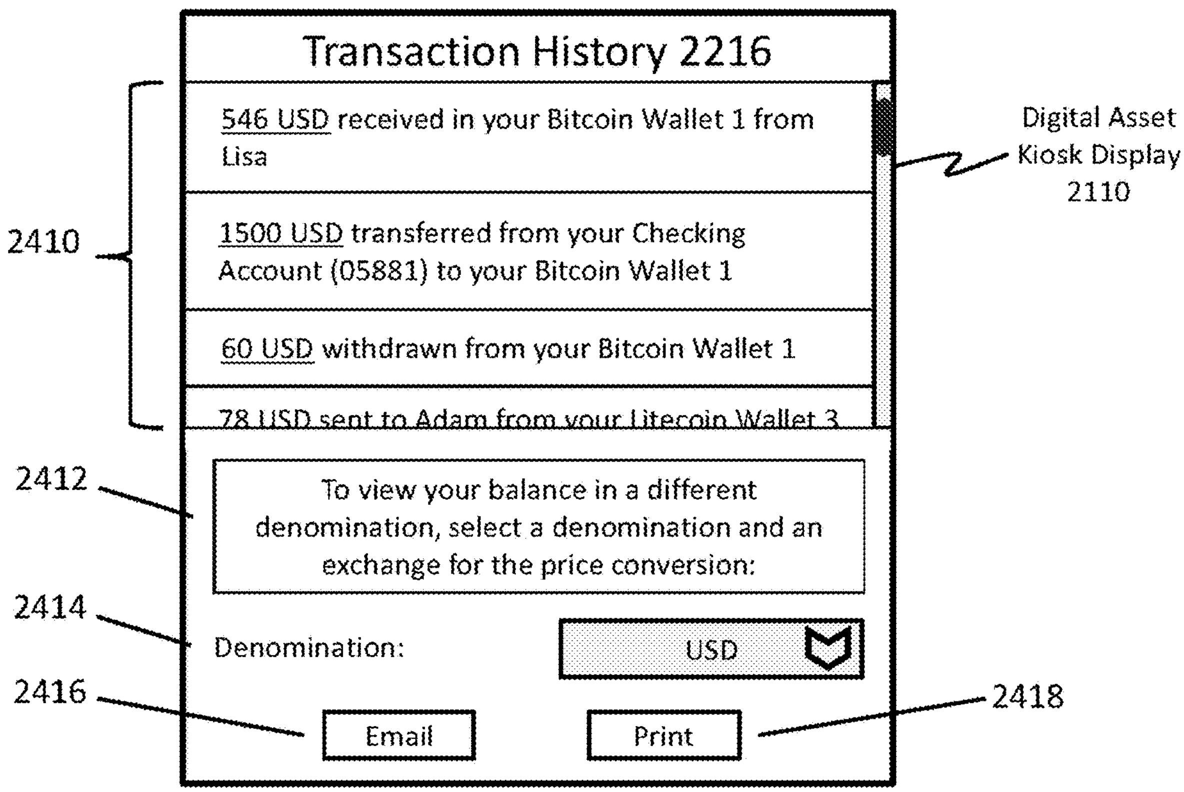
Figure 87:
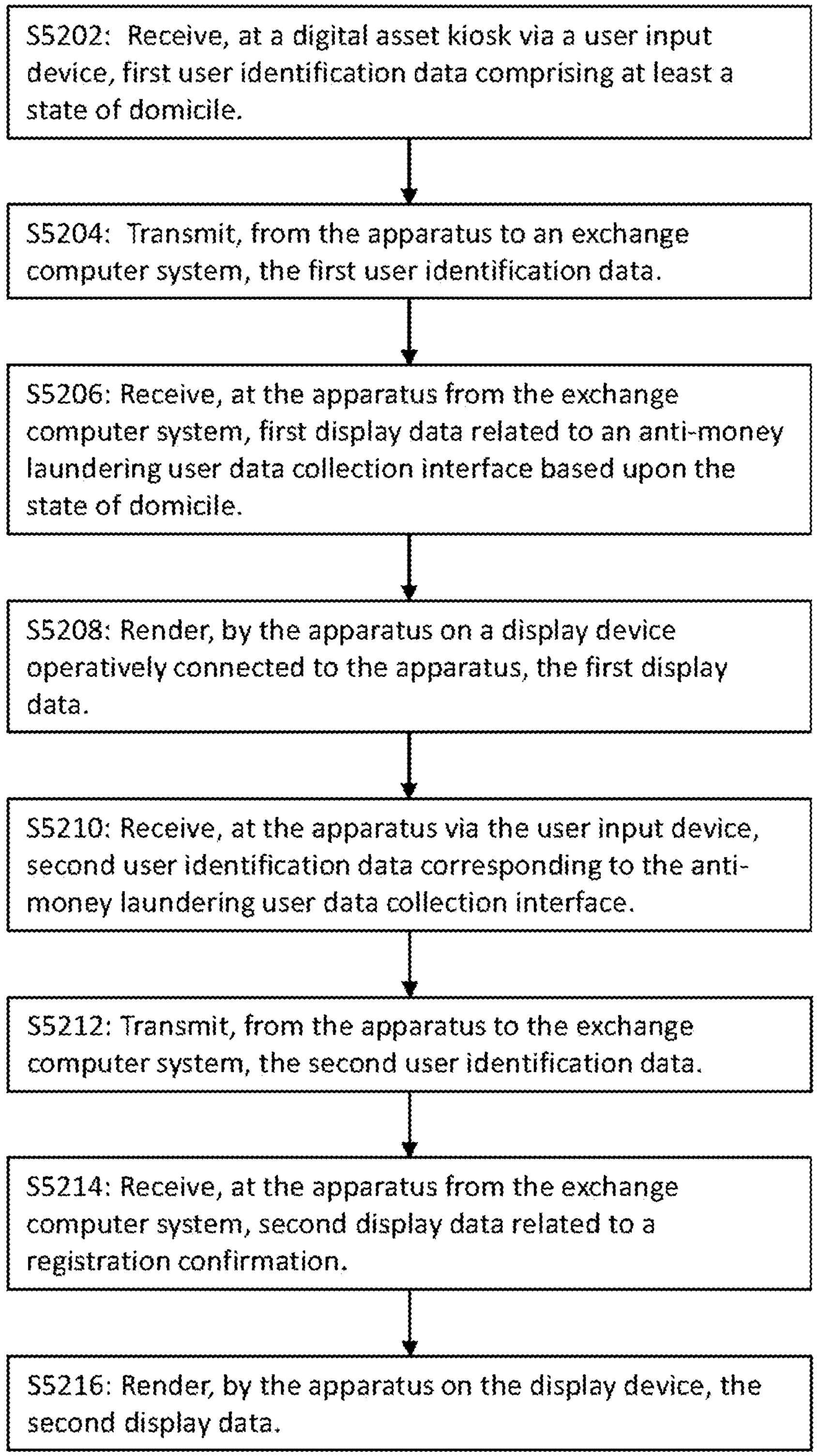
Figure 88A:
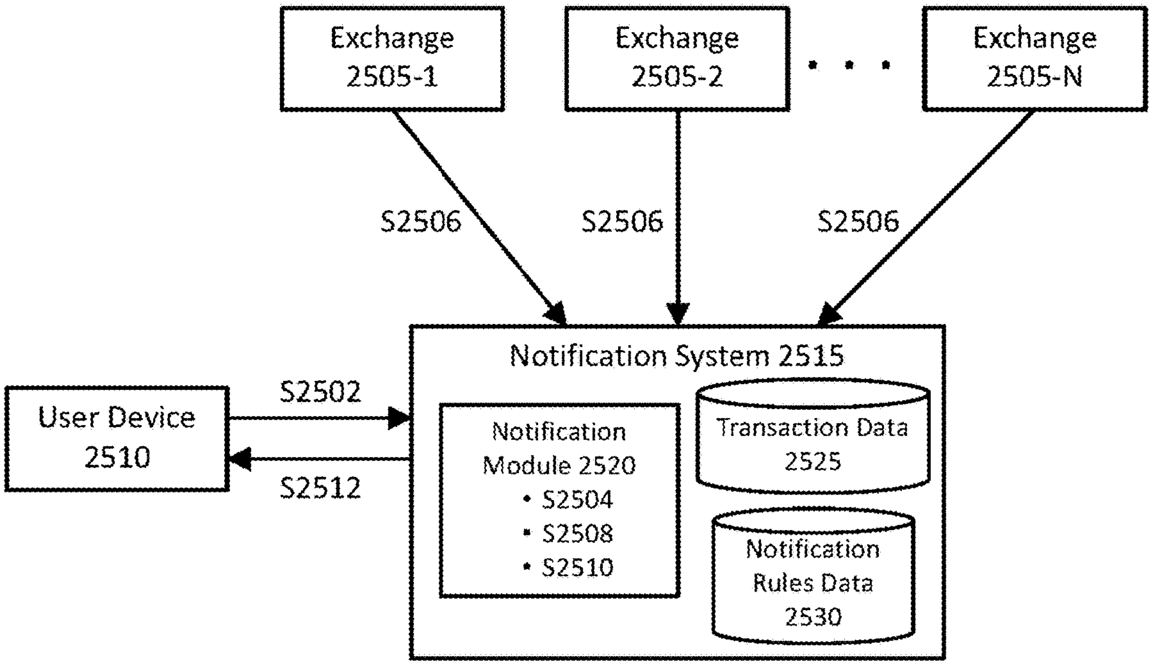
Figure 88B:
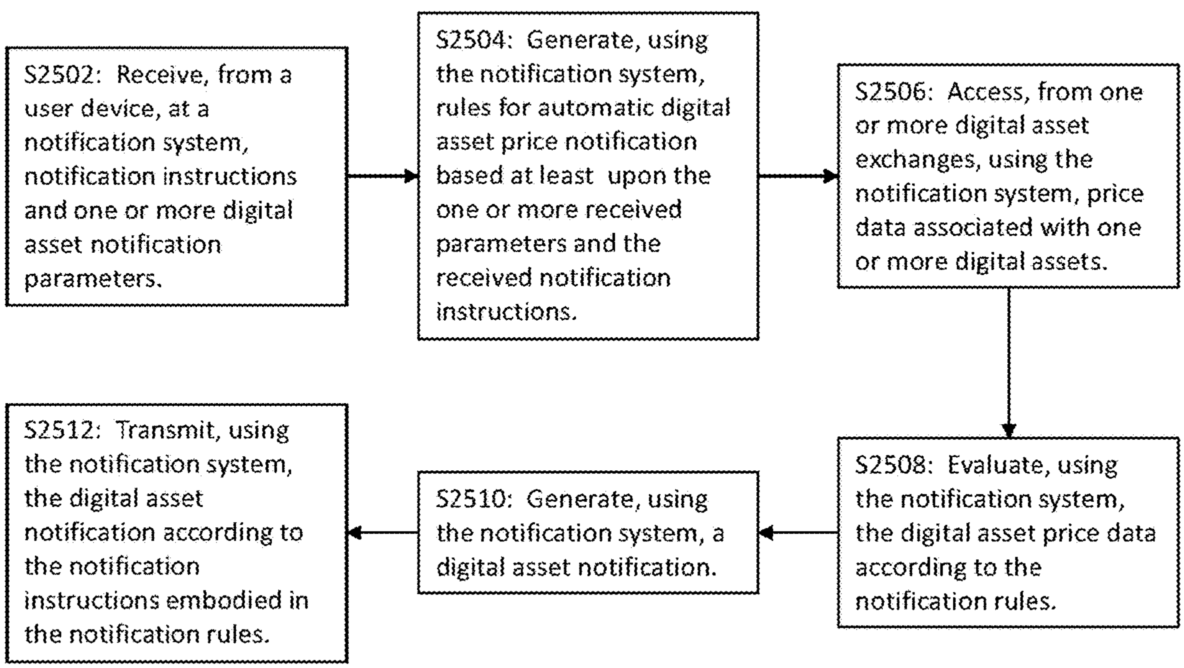
Figure 89A:
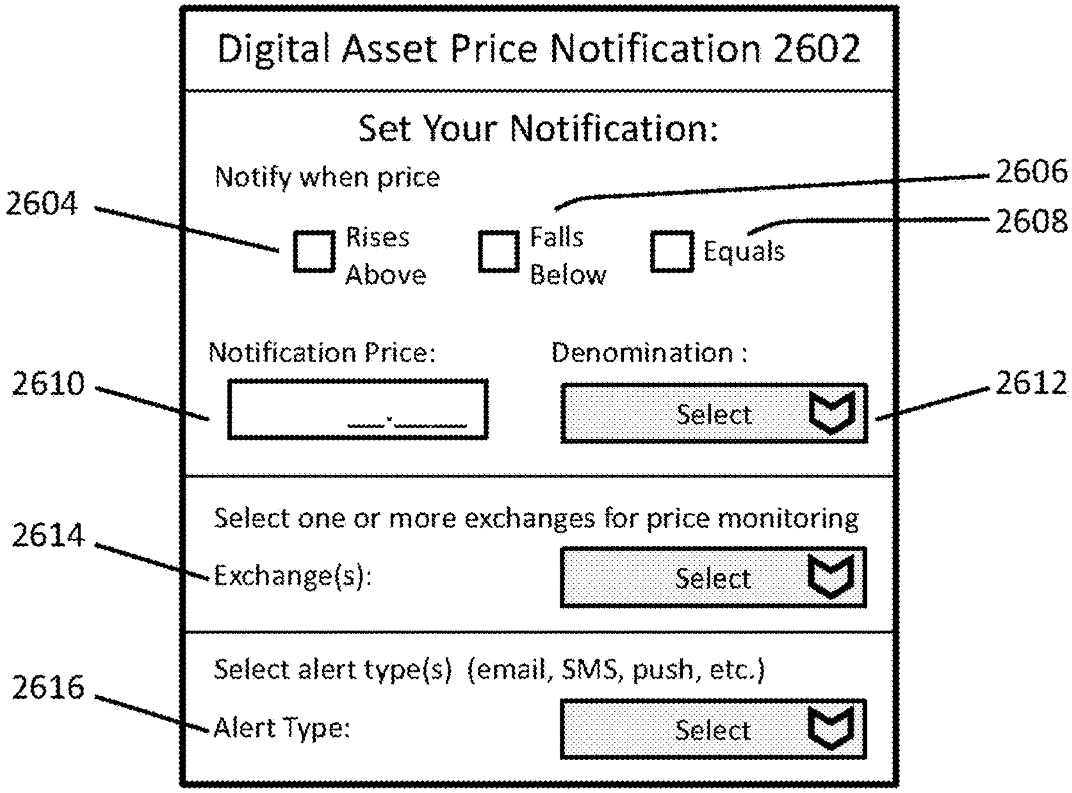
Figure 89B:
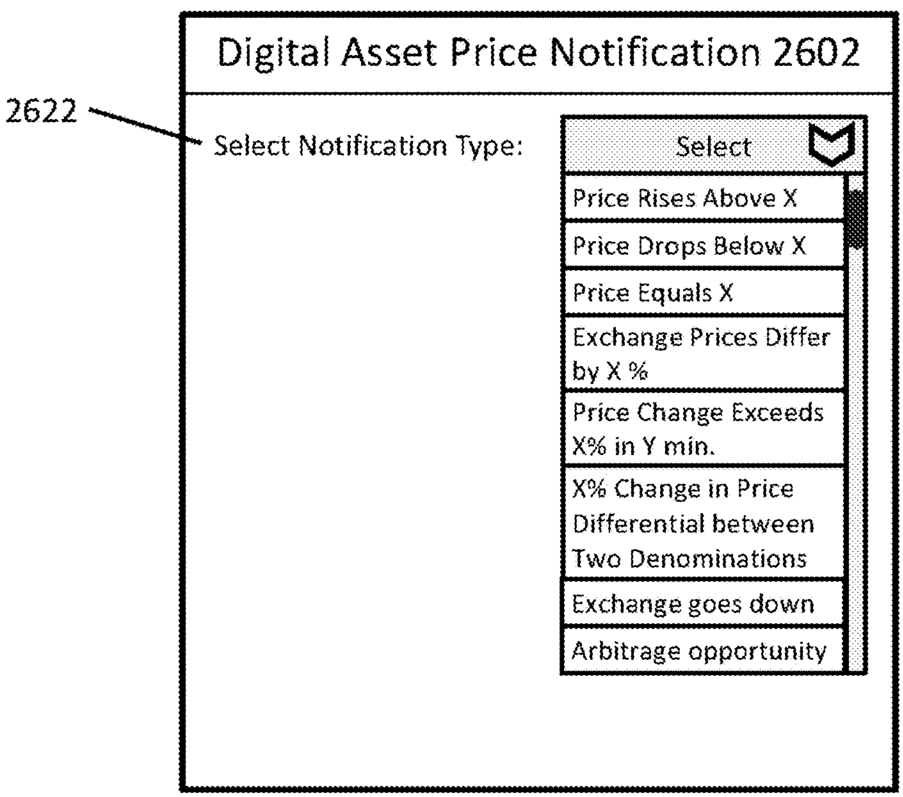
Figure 90A:
Figure 90B:
Figure 90C:
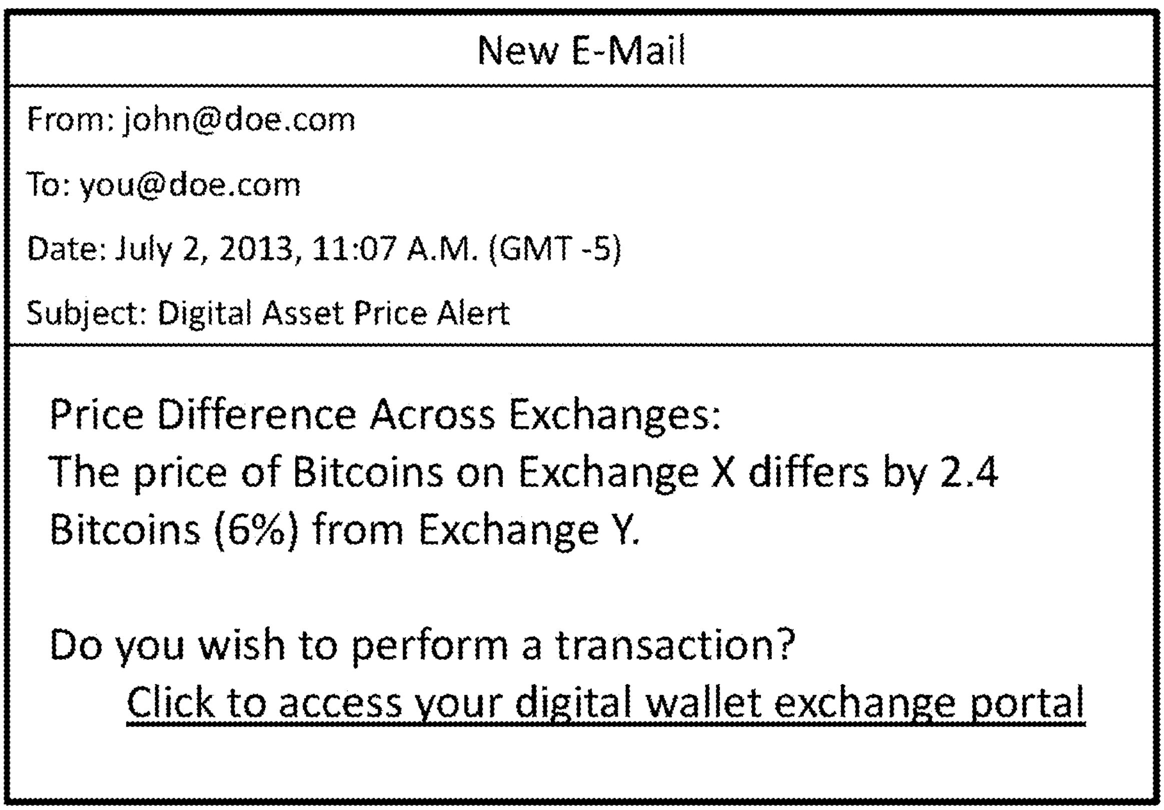
Figure 91A:
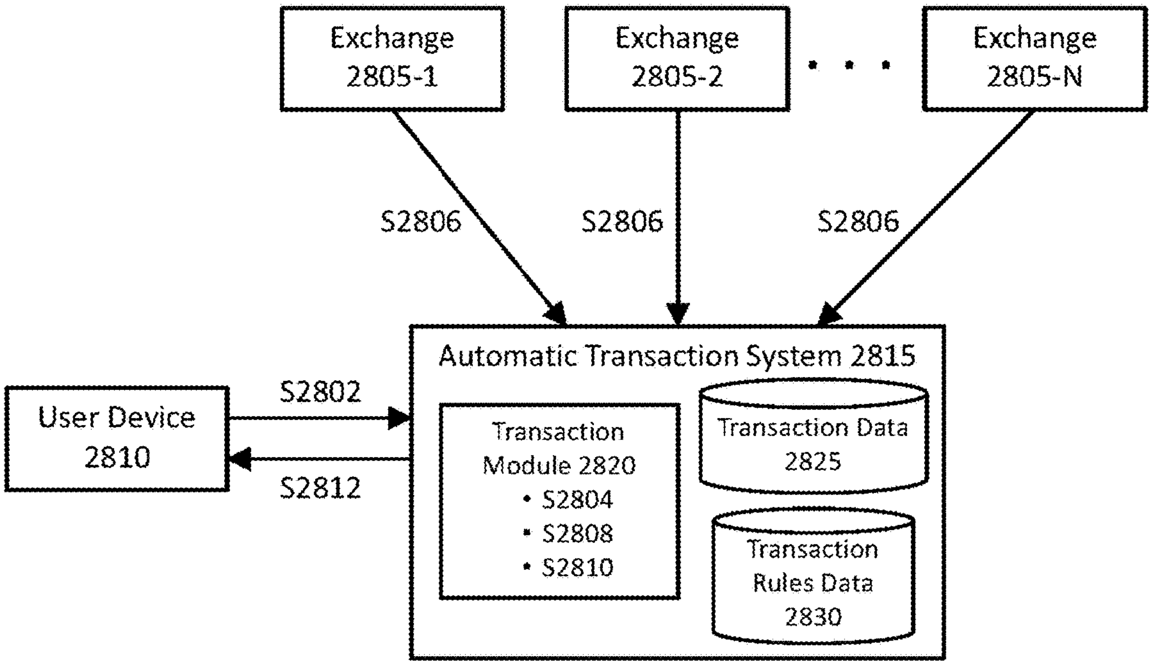
Figure 91B:
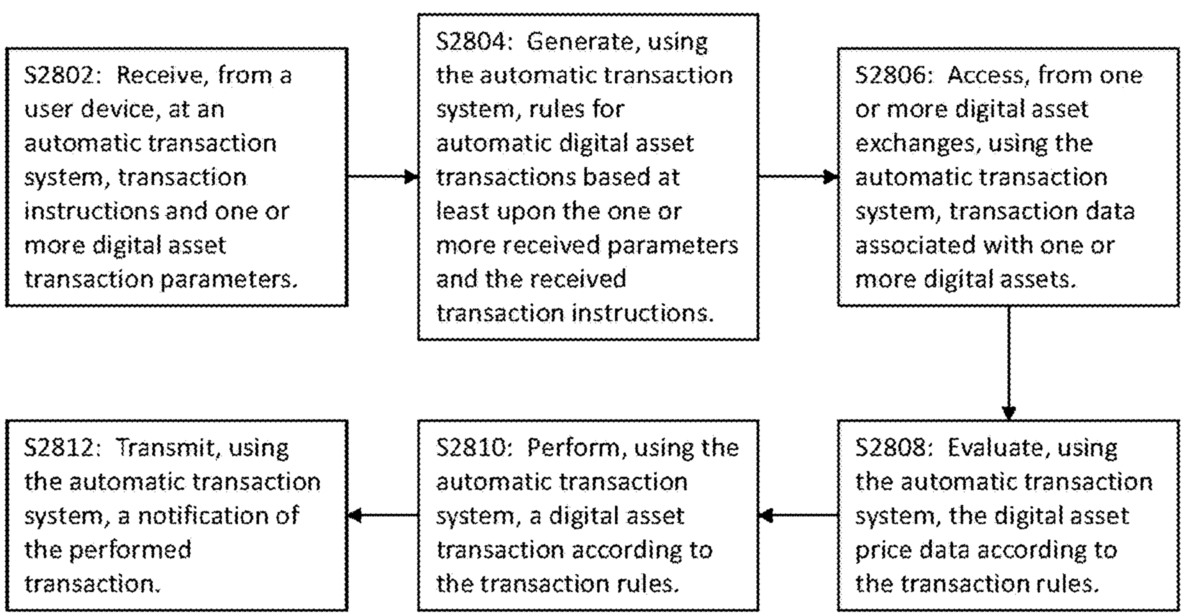
Figure 92A:
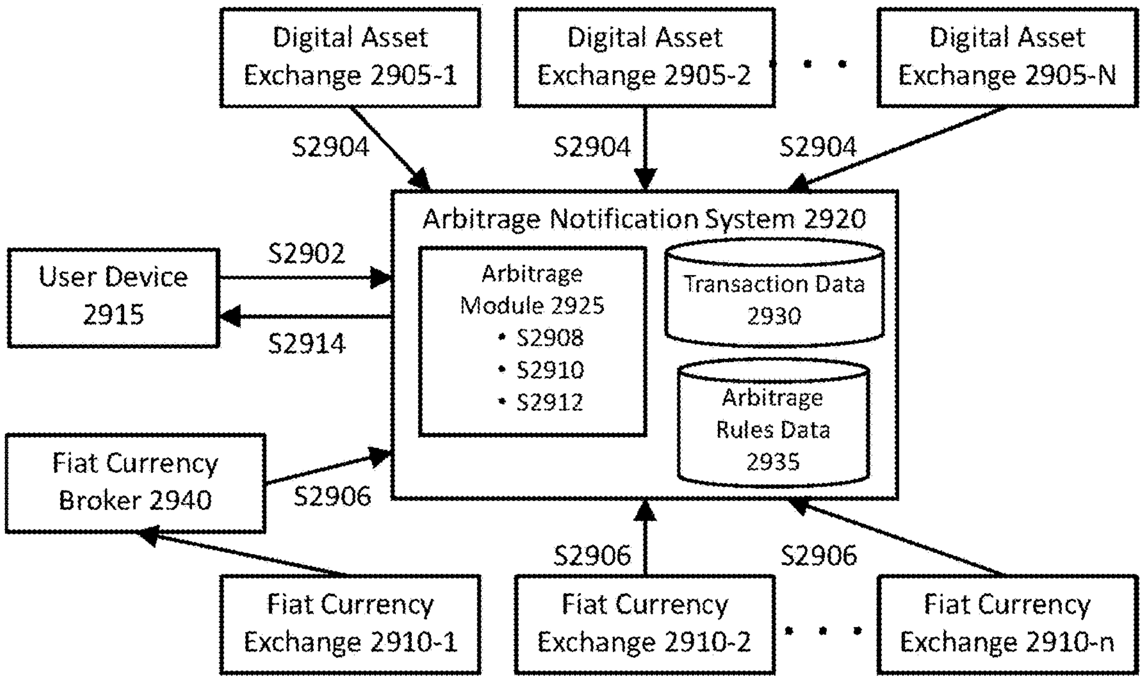
Figure 92B:
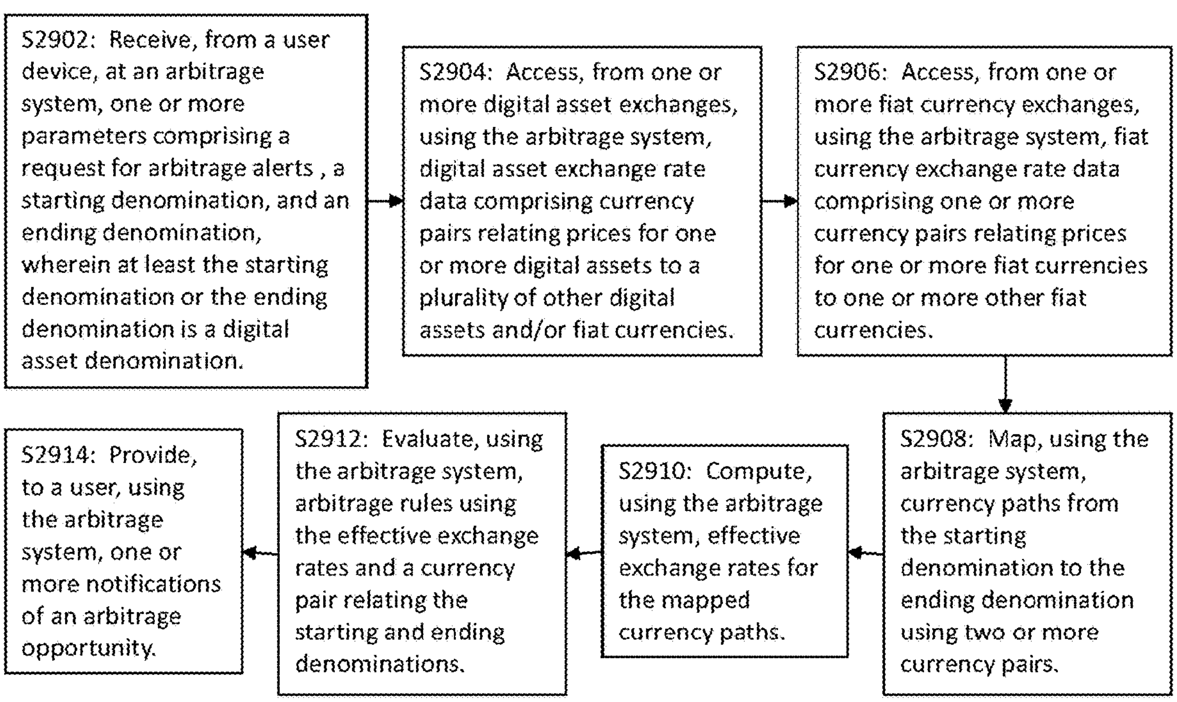
Figure 93A:
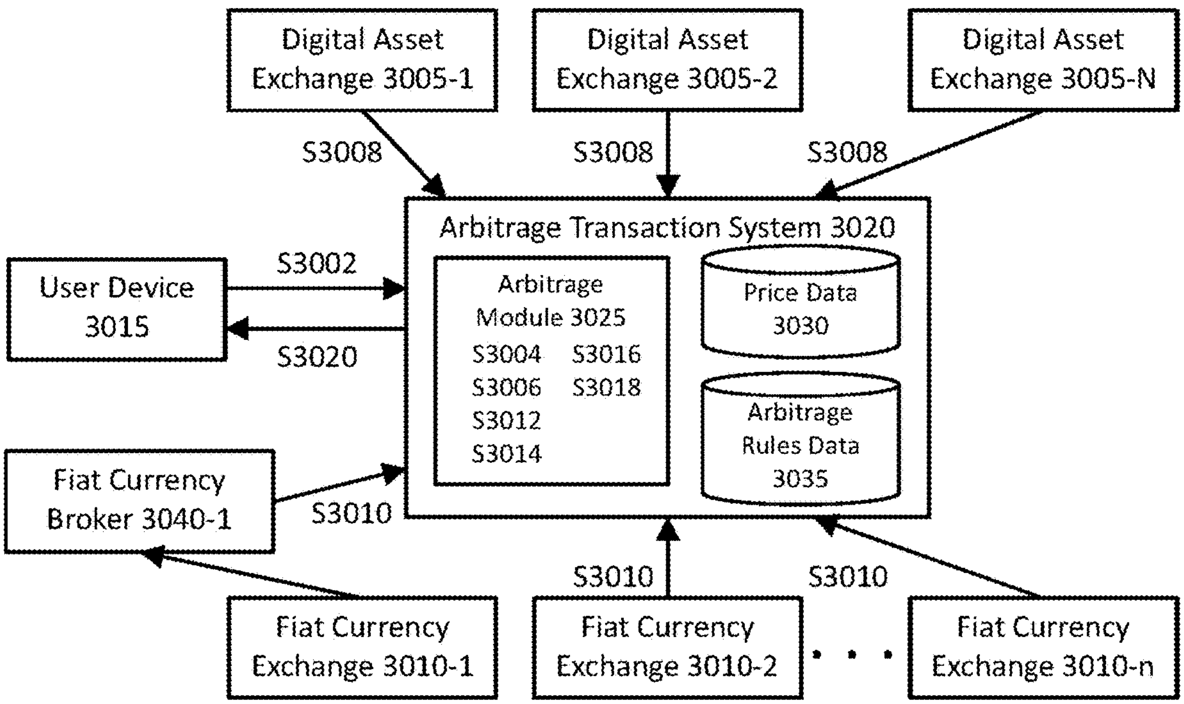
Figure 93B:
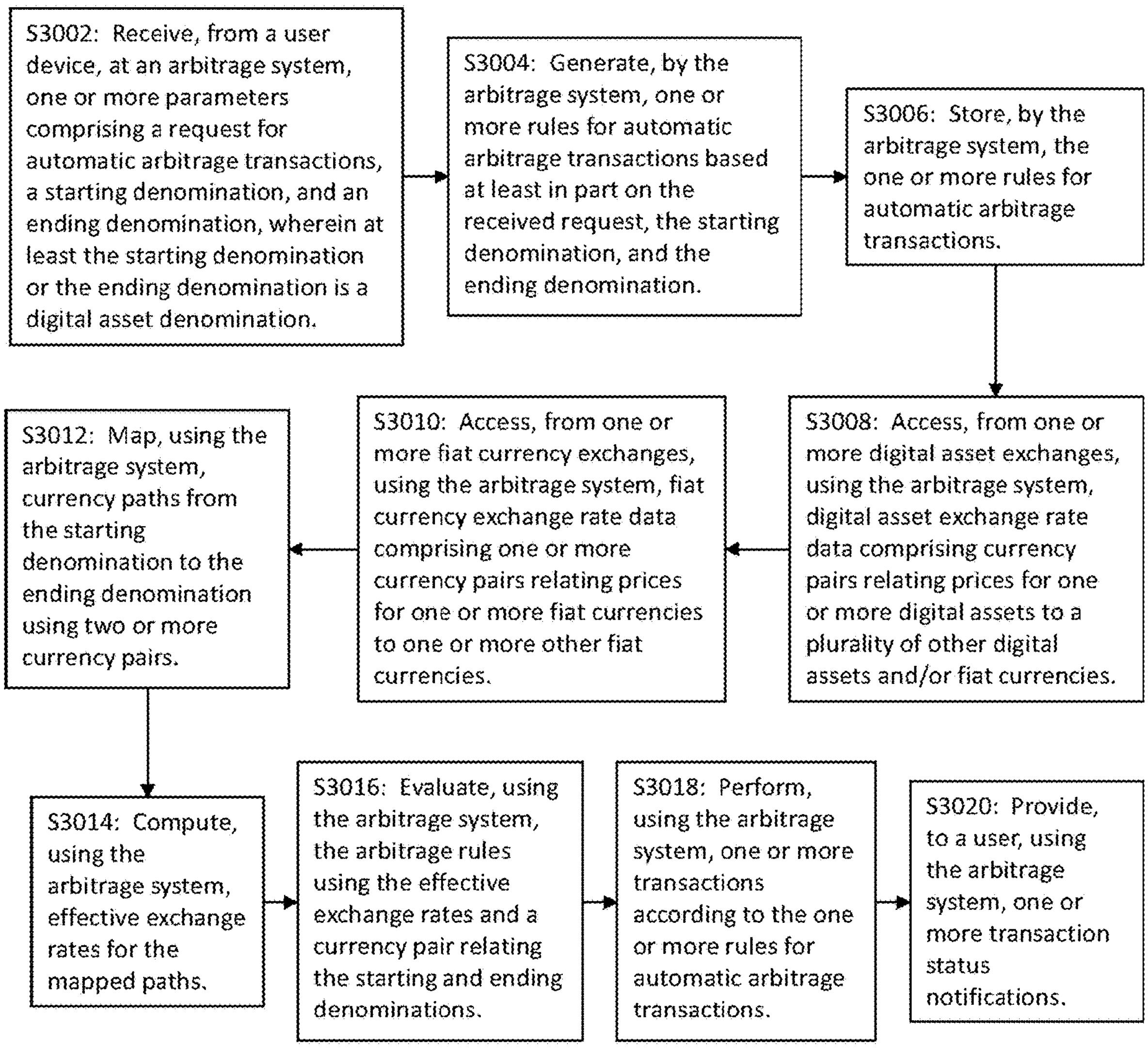
Figure 94A:
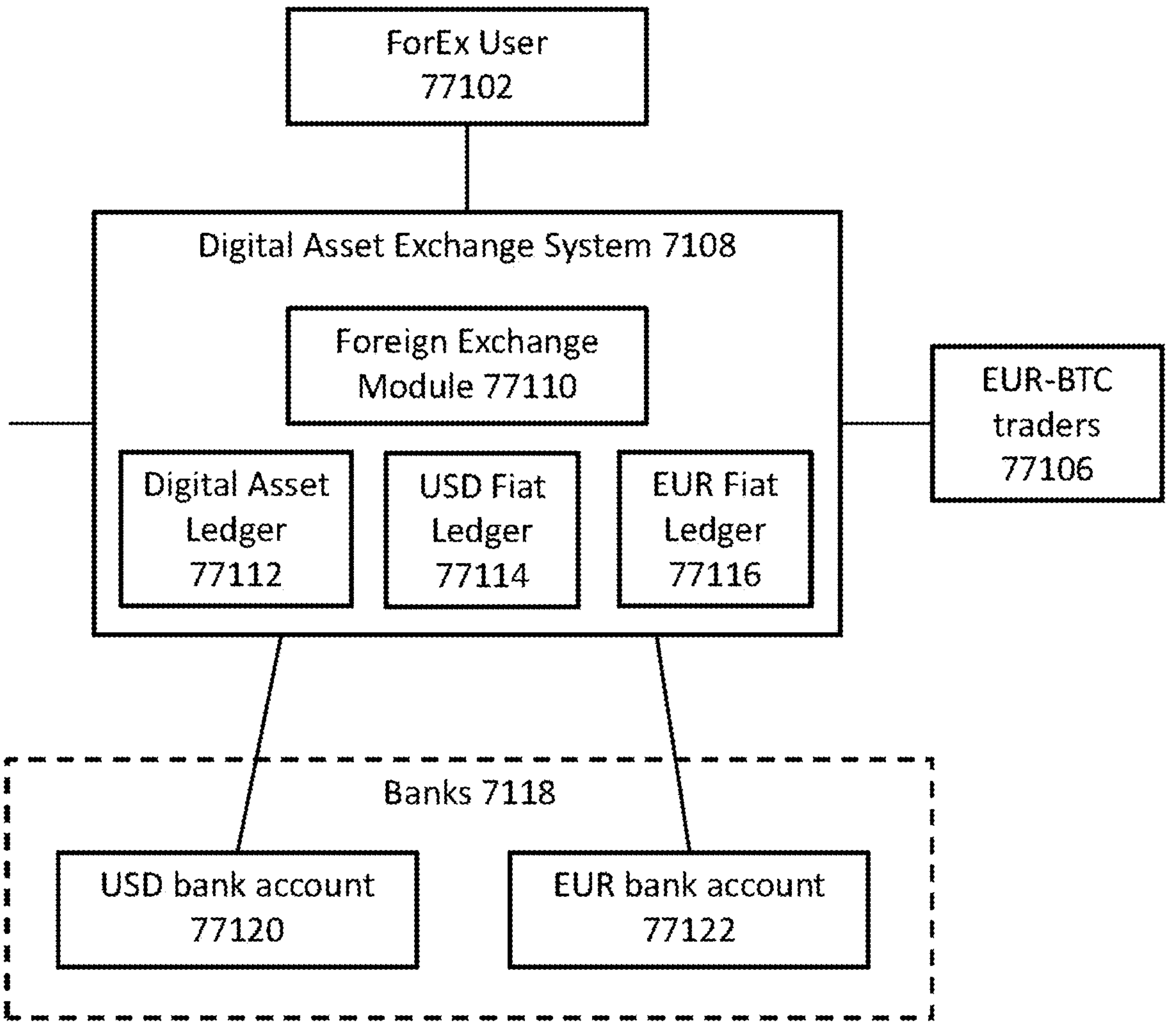
Figure 94B:
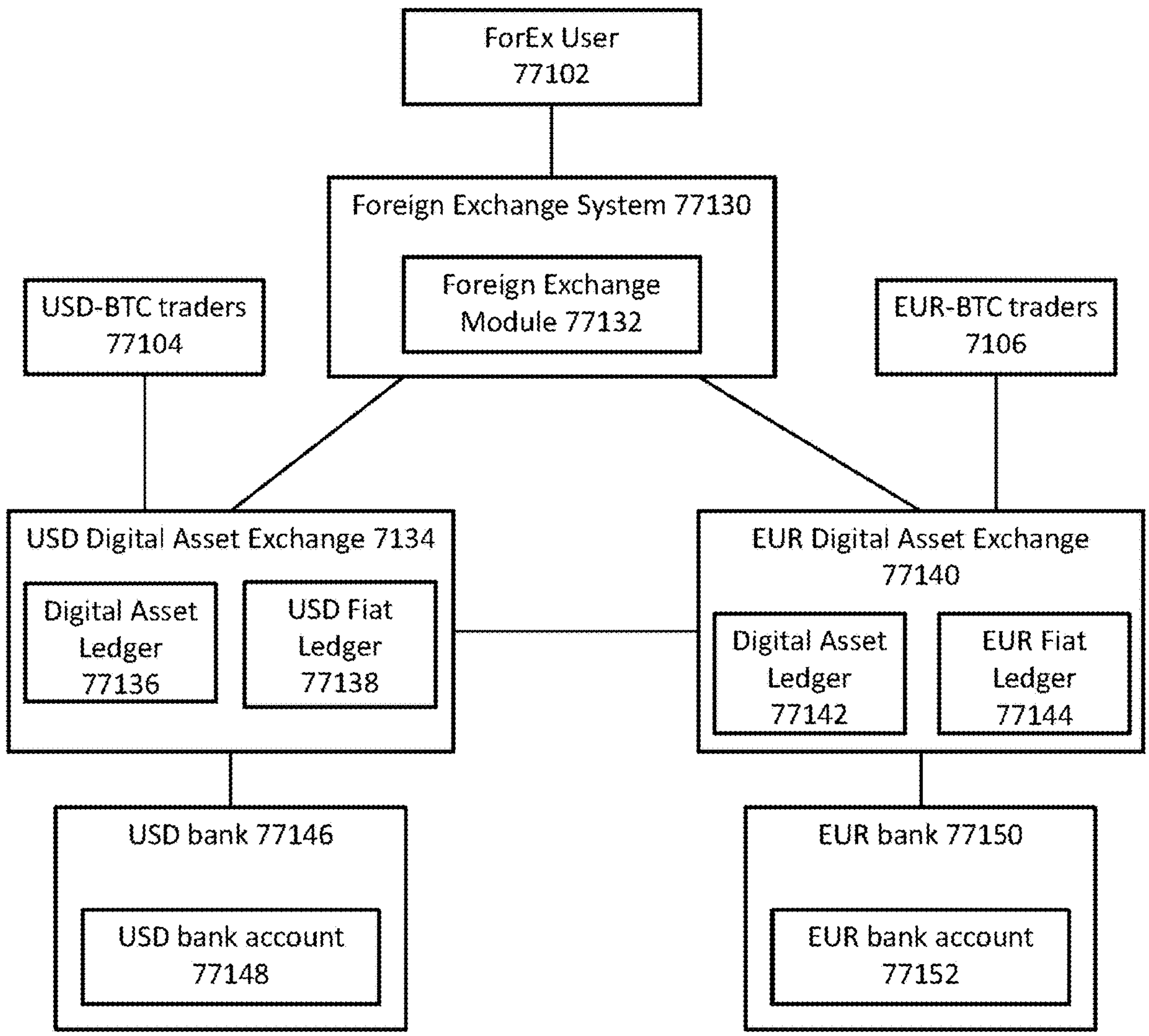
Figure 94C:
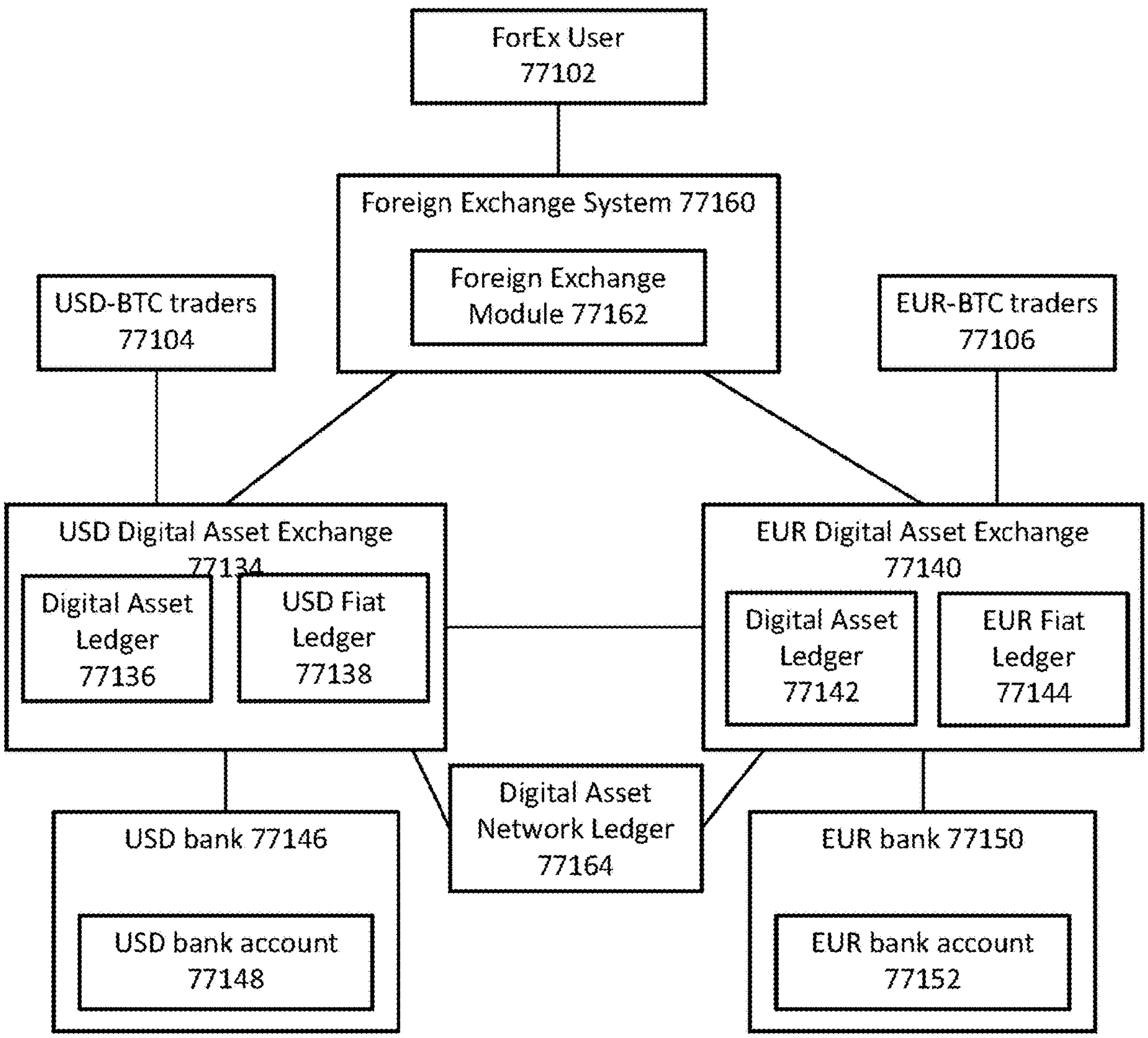
Figure 95A:
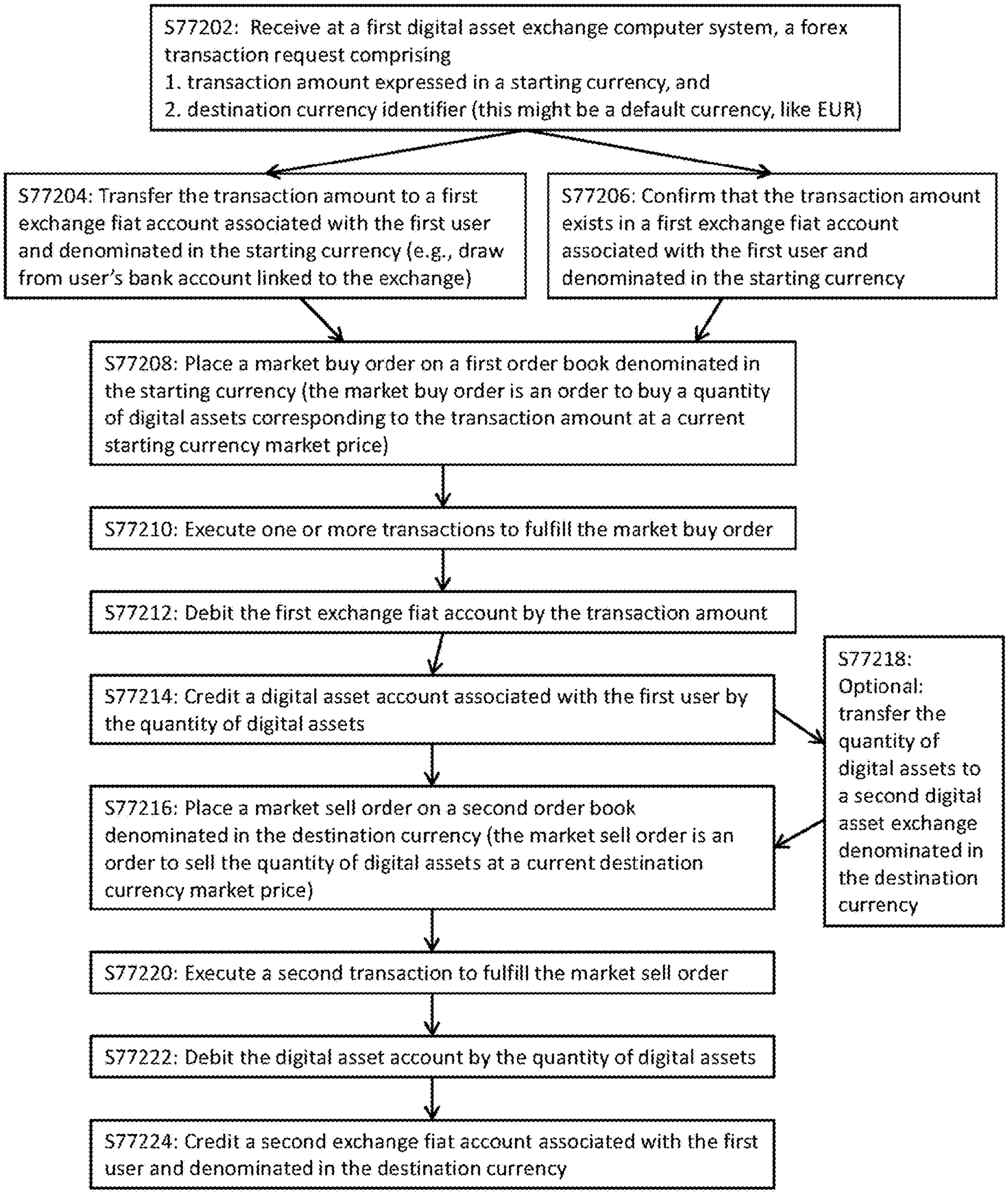
Figure 95B:
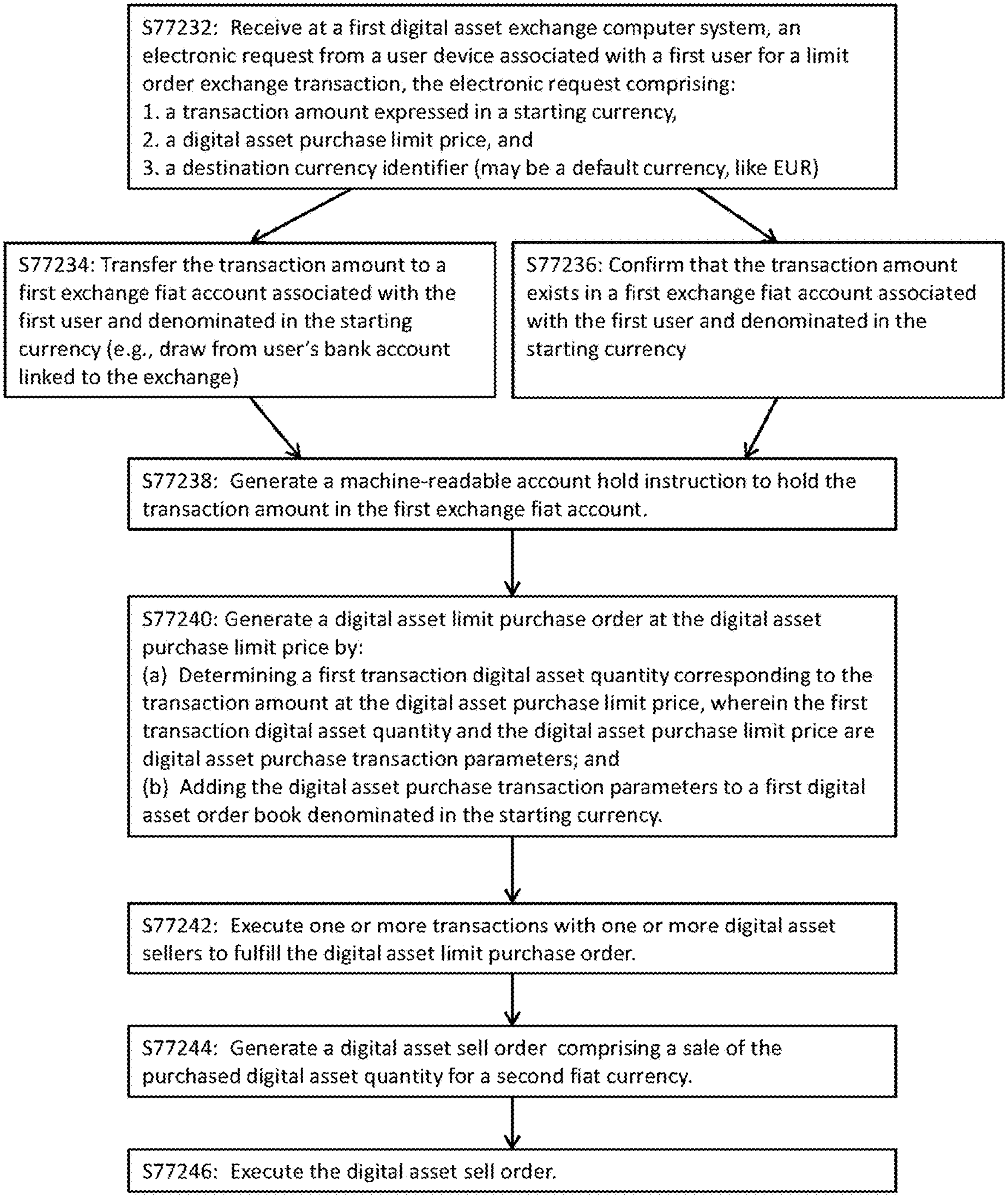

FIG. 80 is an exemplary schematic diagram of a digital asset exchange transaction system in accordance with exemplary embodiments of the present invention;

FIGS. 81A-B are a schematic diagram and corresponding flow chart showing participants in and processes for a digital asset exchange system in accordance with exemplary embodiments of the present invention;

FIGS. 82A-L are exemplary screen shots of user interfaces provided by an exchange computer system in accordance with exemplary embodiments of the present invention;

FIG. 83 is a schematic diagram of participants in a system including a digital asset kiosk and a digital asset exchange in accordance with exemplary embodiments of the present invention;

FIGS. 84A-B are flow charts of processes for determining a money transmit business to process transactions in accordance with exemplary embodiments of the present invention;

FIG. 85 is a schematic diagram of a digital asset kiosk in accordance with exemplary embodiments of the present invention;

FIGS. 86A-Q are schematic diagrams of a digital asset kiosk display showing exemplary interfaces for various transactions and functions involving digital assets in accordance with exemplary embodiments of the present invention;

FIG. 87 is a flow chart of an exemplary process for performing an exchange transaction from an electronic kiosk in accordance with exemplary embodiments of the present invention;

FIGS. 88A-B are a schematic diagram and corresponding flow chart showing participants in and processes for digital asset notifications in accordance with exemplary embodiments of the present invention;

FIGS. 89A-B are exemplary screen shots associated with setting digital asset notification in accordance with exemplary embodiments of the present invention;

FIGS. 90A-C are exemplary screen shots of digital asset notifications in accordance with exemplary embodiments of the present invention;

FIGS. 91A-B are a schematic diagram and corresponding flow chart showing participants in and processes for automated digital asset transactions in accordance with exemplary embodiments of the present invention;

FIGS. 92A-B are a schematic diagram and corresponding flow chart showing participants in and processes for providing digital asset arbitrage opportunity notifications in accordance with exemplary embodiments of the present invention;

FIGS. 93A-B are a schematic diagram and corresponding flow chart showing participants in and processes for performing automated digital asset arbitrage transactions in accordance with exemplary embodiments of the present invention;

FIGS. 94A-C are schematic diagrams of foreign exchange systems in accordance with exemplary embodiments of the present invention;

FIGS. 95A-B are flow charts of exemplary processes for performing foreign exchange transactions in accordance with exemplary embodiments of the present invention;

FIGS. 96A-E are exemplary screen shots of user interfaces related to purchase transactions provided by an exchange computer system in accordance with exemplary embodiments of the present invention;

FIGS. 97A-E are exemplary screen shots of user interfaces related to sale transactions provided by an exchange computer system in accordance with exemplary embodiments of the present invention; and FIGS. 98A-C are flow charts of exemplary processes for generating graphical user interfaces representing an electronic order book in accordance with exemplary embodiments of the present invention.

Figure 99:
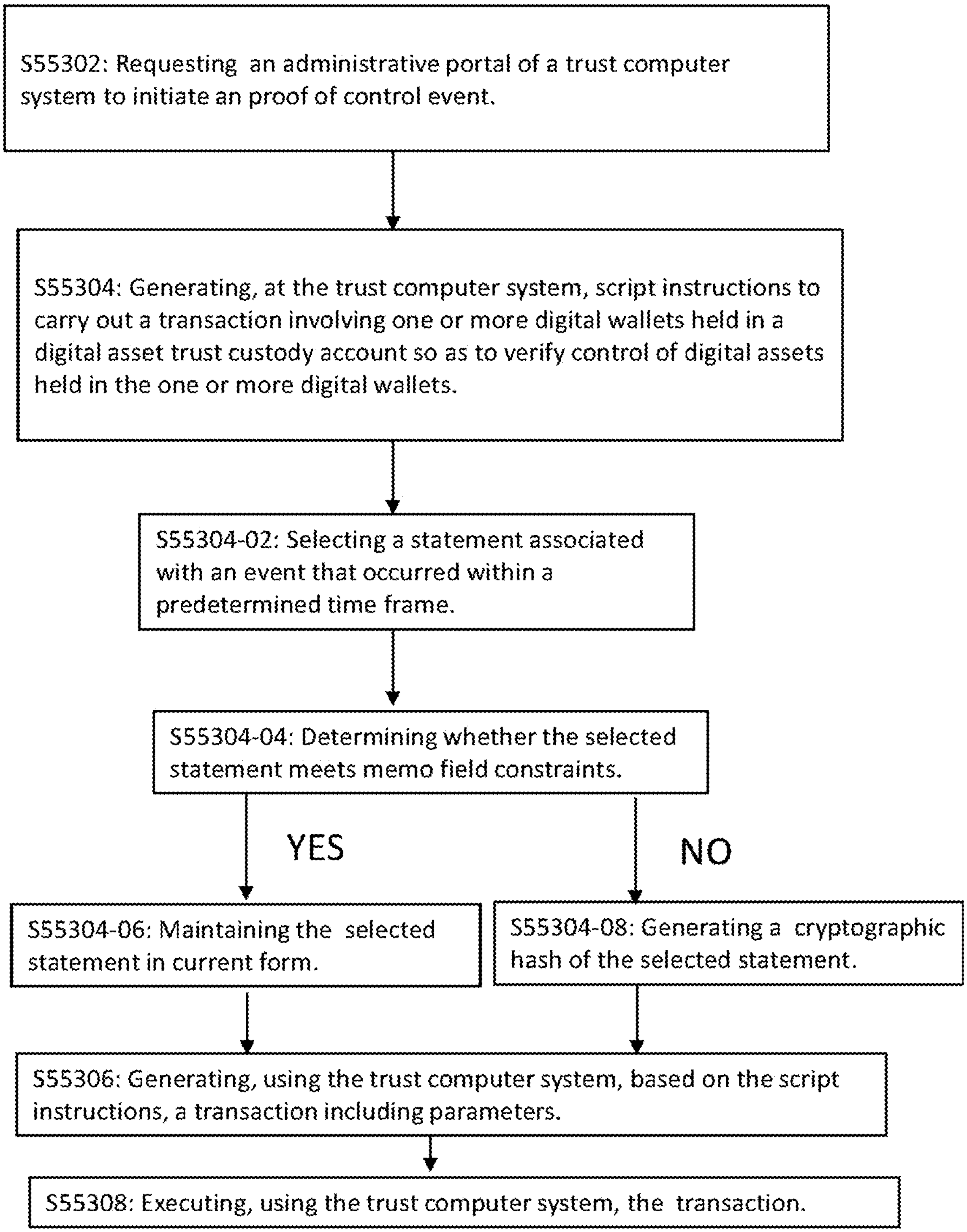

FIG. 99 is an exemplary flow chart for a method of providing proof of control from a custodial digital asset account.

Figure 101:
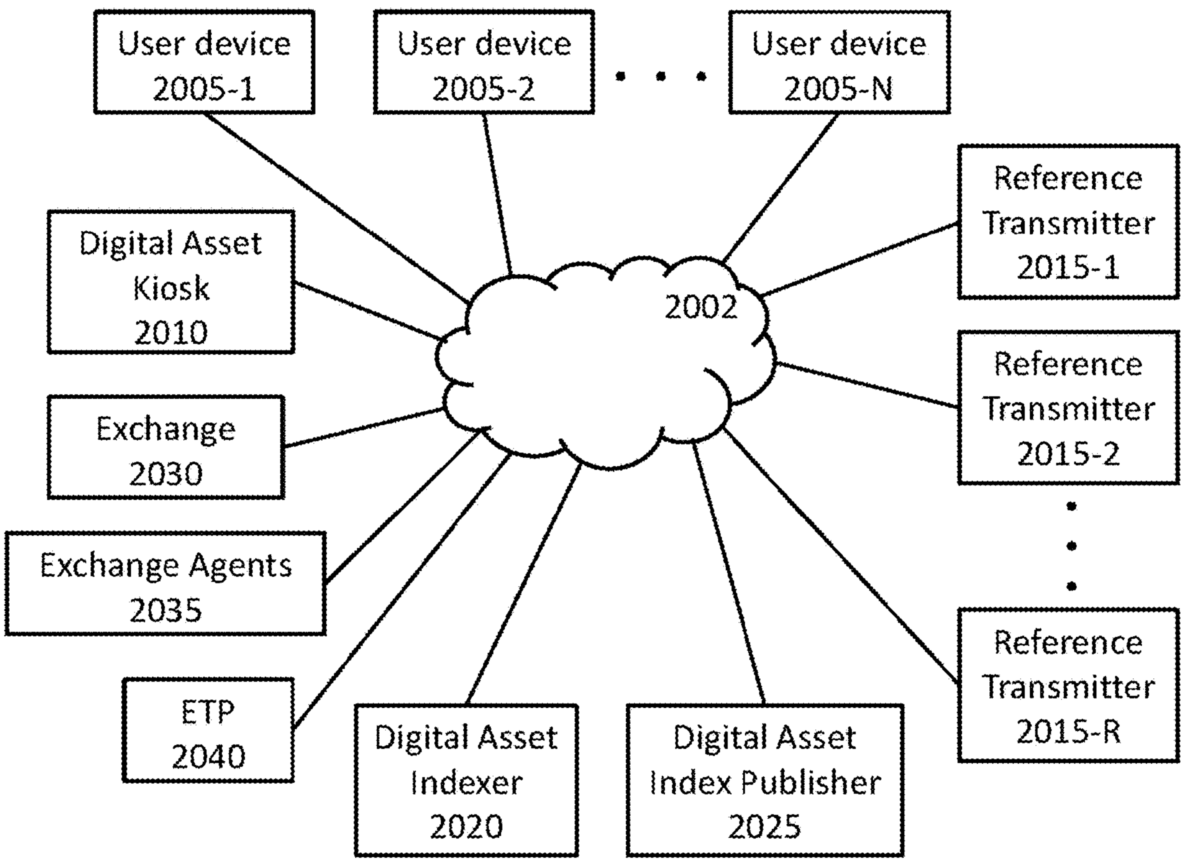
Figure 102A:
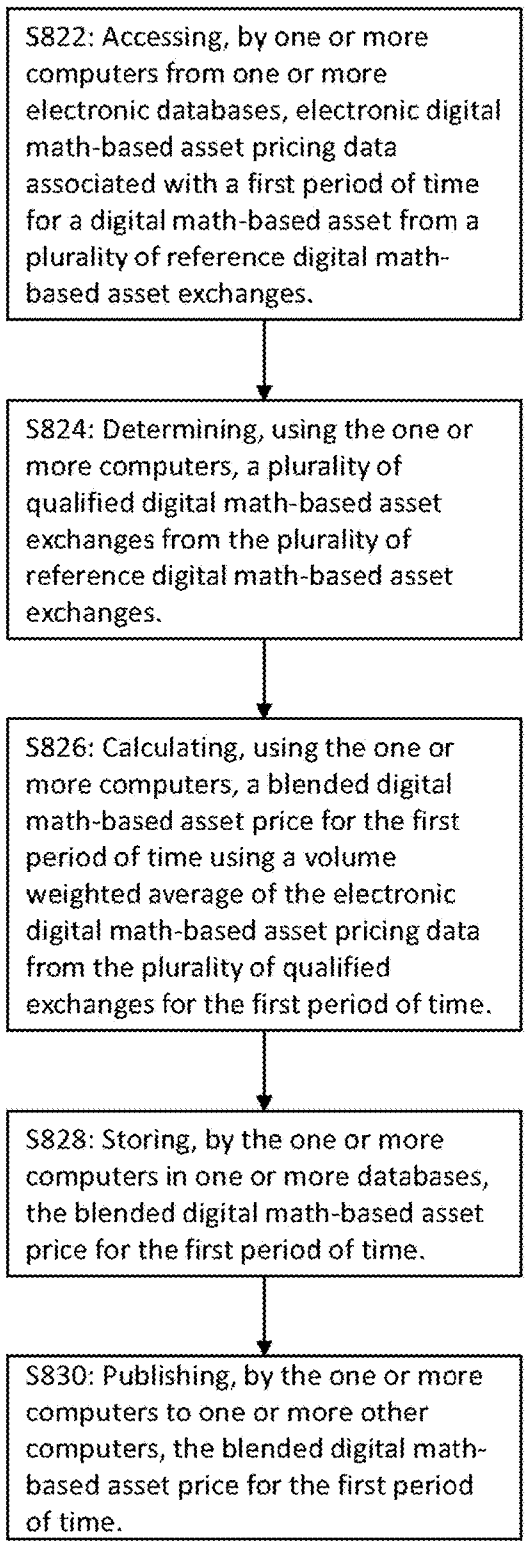
Figure 102B:
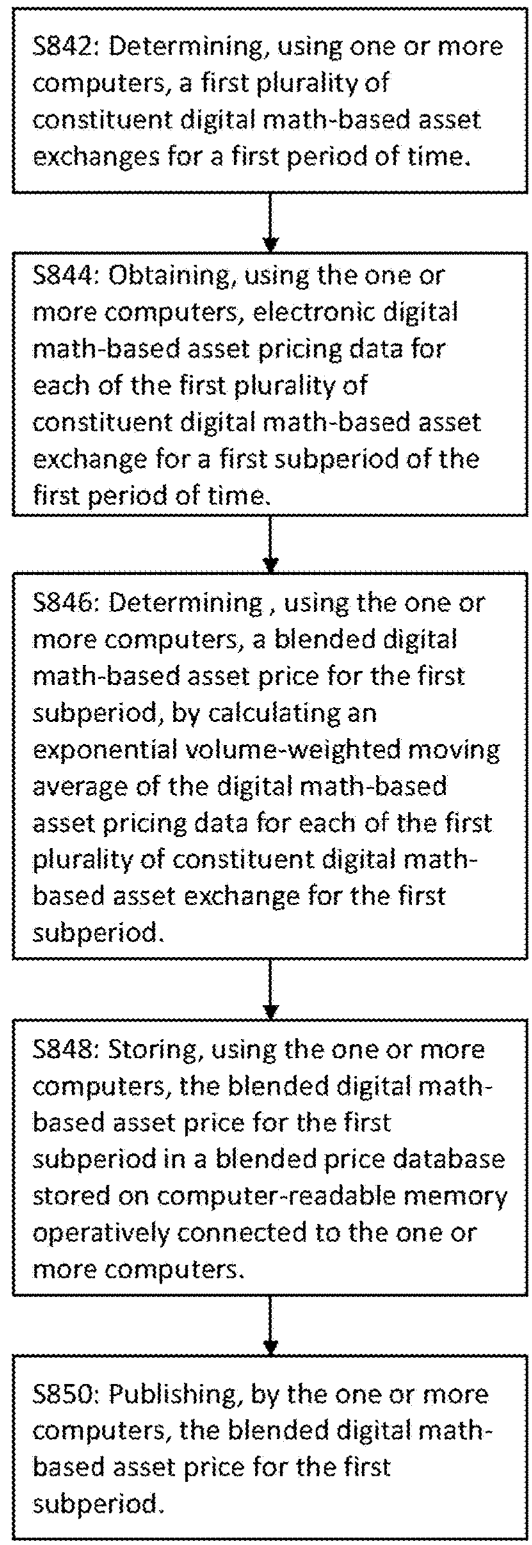

FIGS. 100A-100H are flow charts showing methods for calculating a blended digital asset price in accordance with exemplary embodiments of the present invention;

FIG. 101 is a schematic diagram of participants in a system for providing a digital asset index and a digital asset exchange in accordance with exemplary embodiments of the present invention; and FIGS. 102A and 102B are flow charts of a method for creating an index of digital asset prices in accordance with exemplary embodiments of the present invention.

Figure 1:
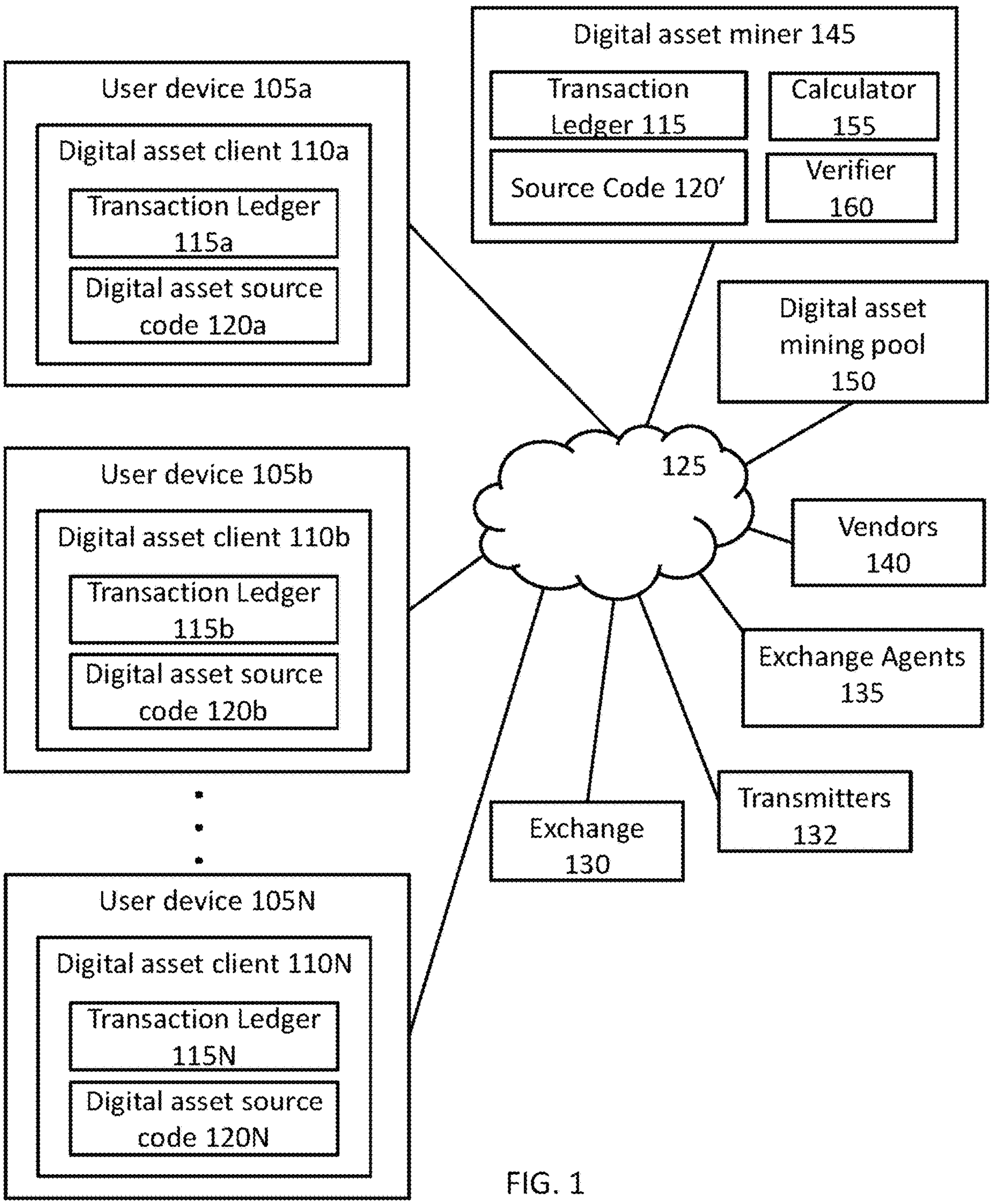
FIG. 1 is a schematic diagram of a digital asset network in accordance with exemplary embodiments of the present invention.
Figure 3:
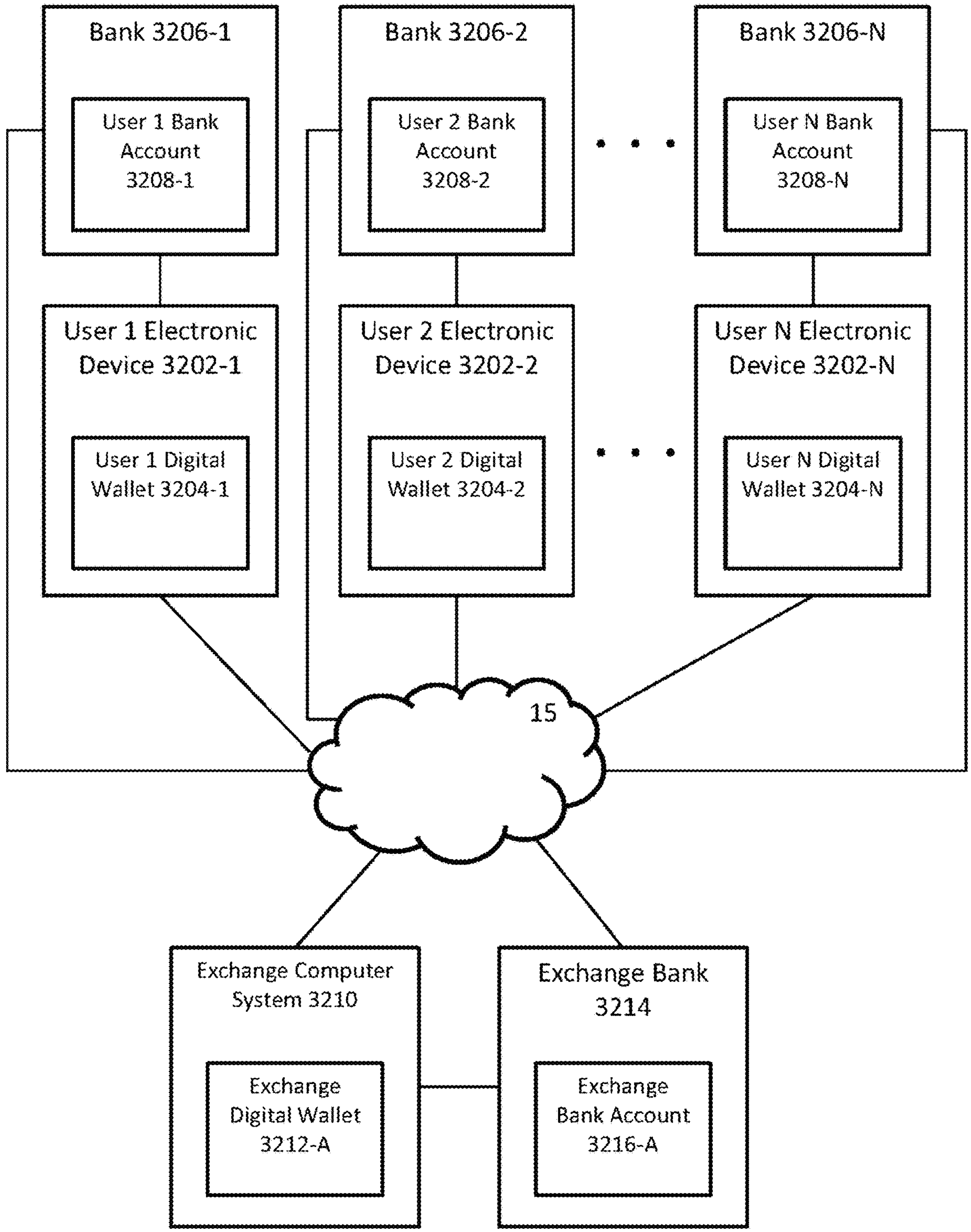
FIG. 3 is an exemplary exchange agent interface in accordance with exemplary embodiments of the present invention.
Figures 1, 11A:
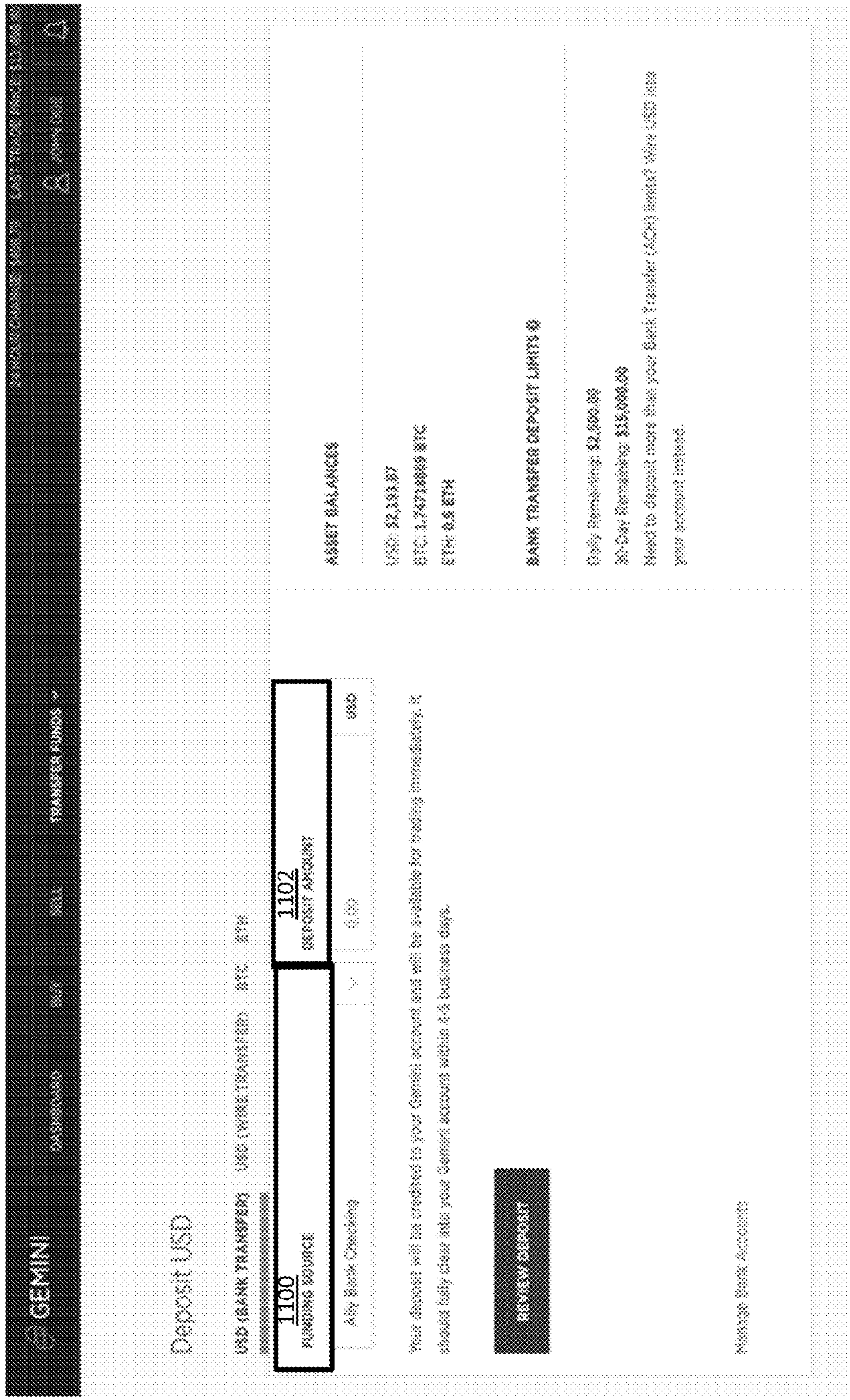
Figures 2, 11A:
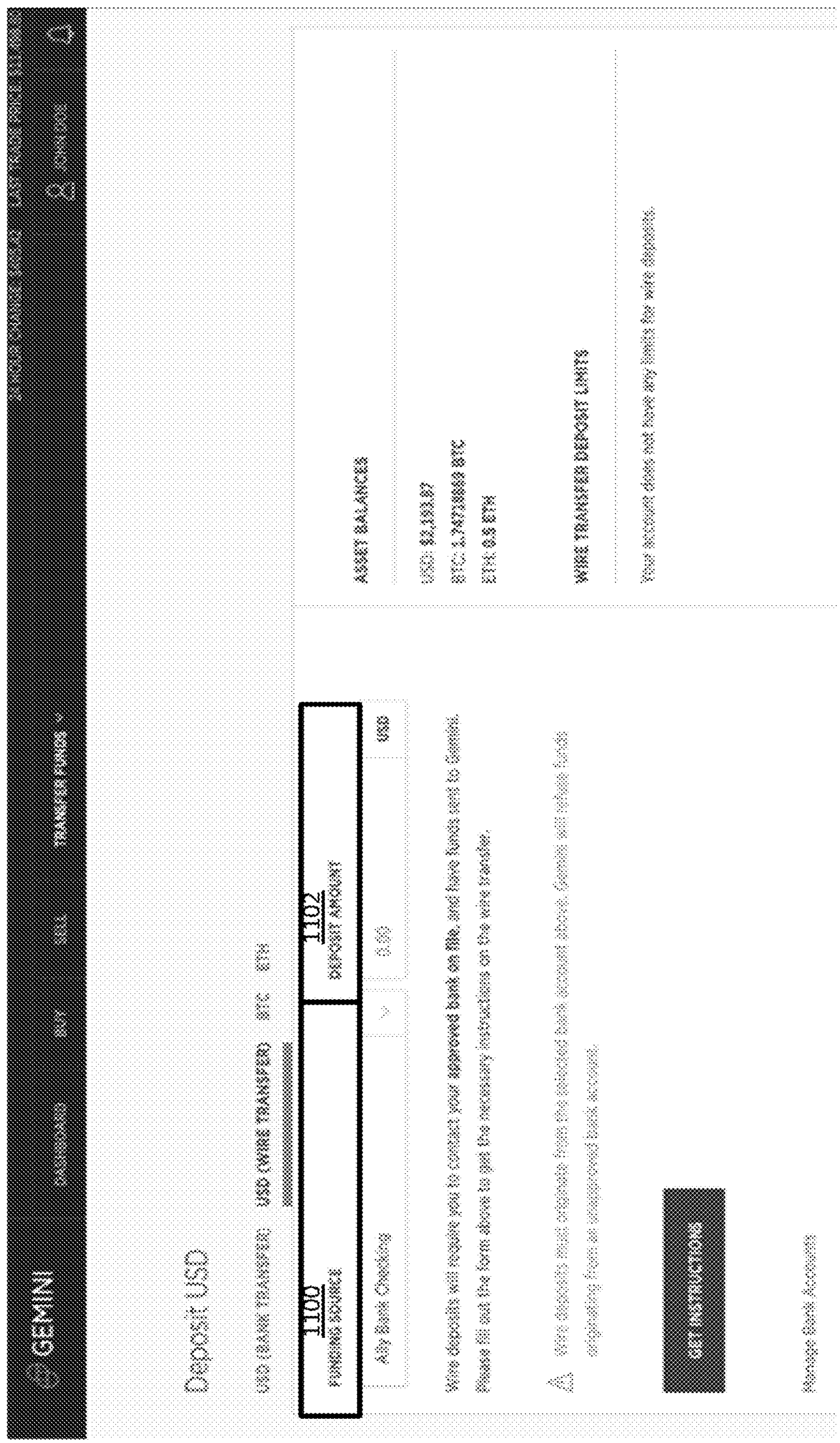
Figures 3, 11A:
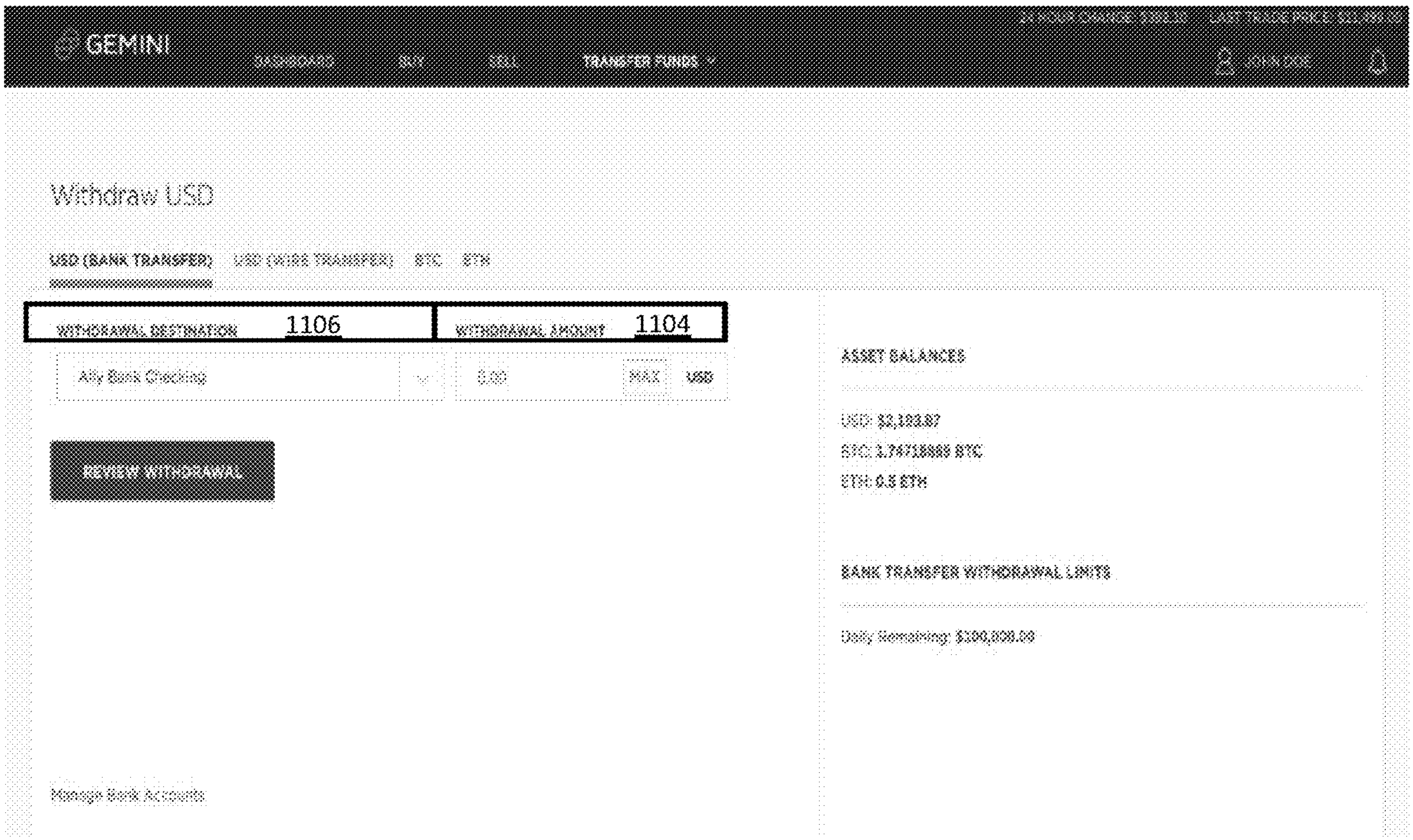
Figures 4, 11A:
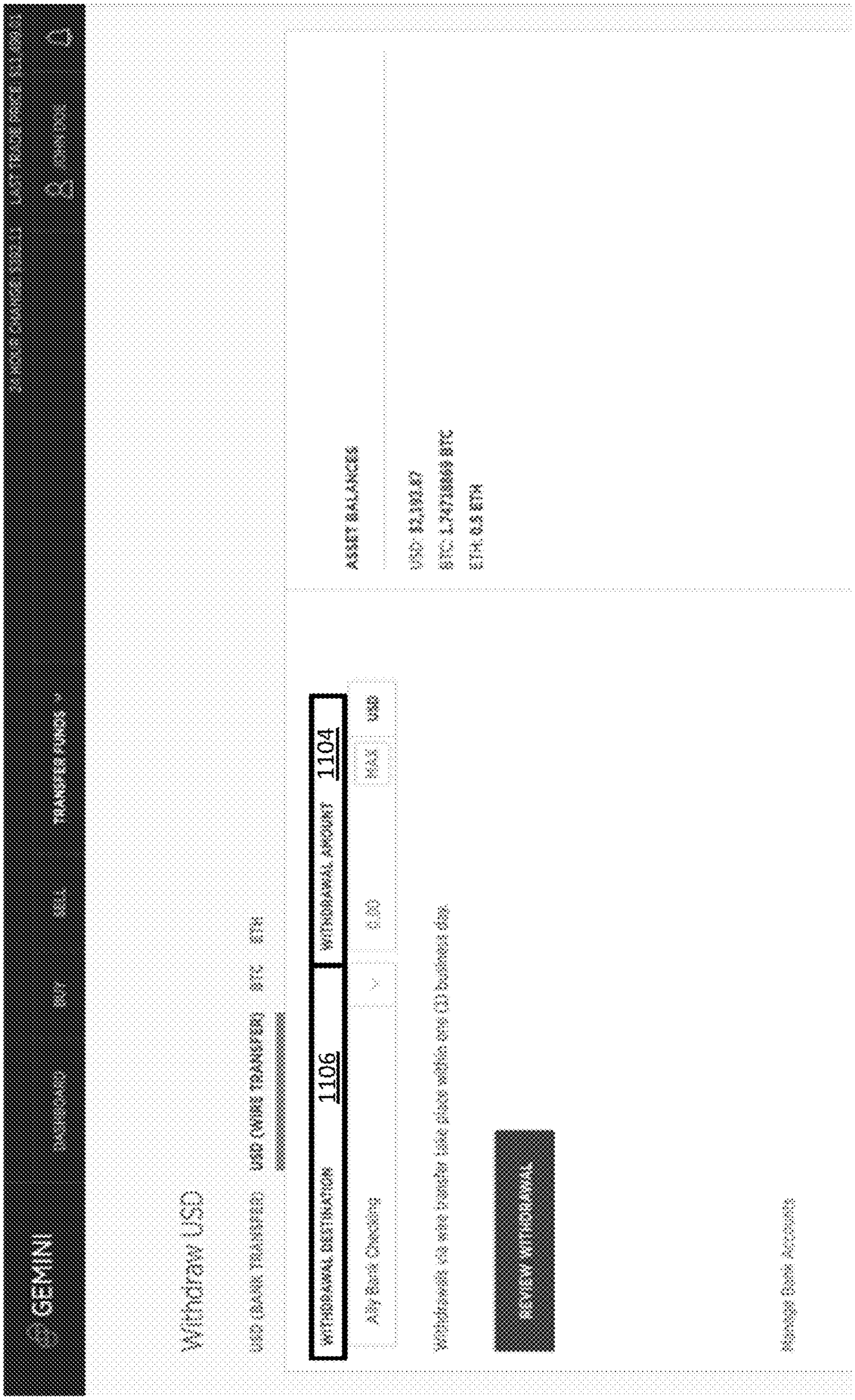
Figures 1, 11B:
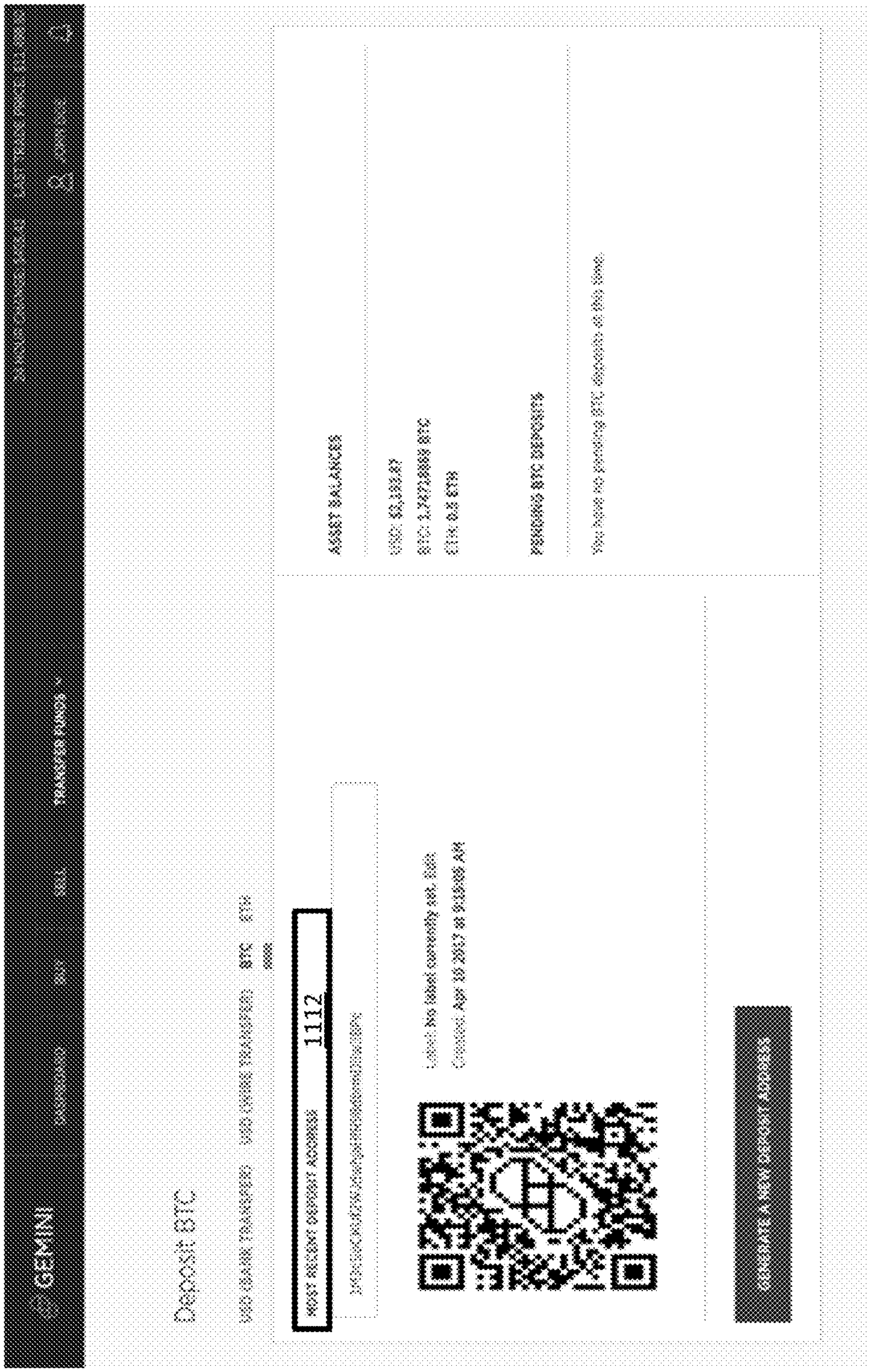
Figures 2, 11B:
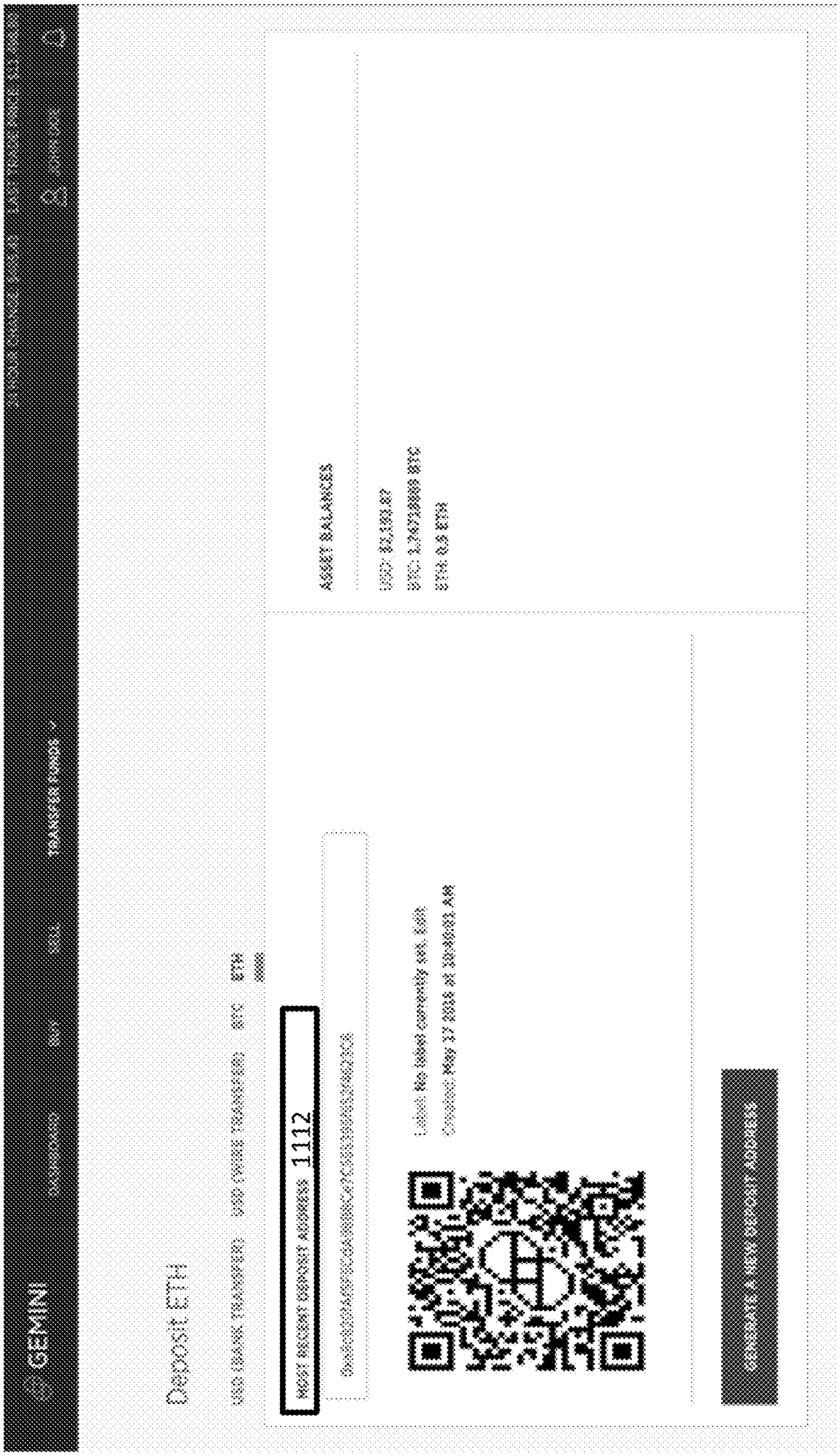
Figures 3, 11B:
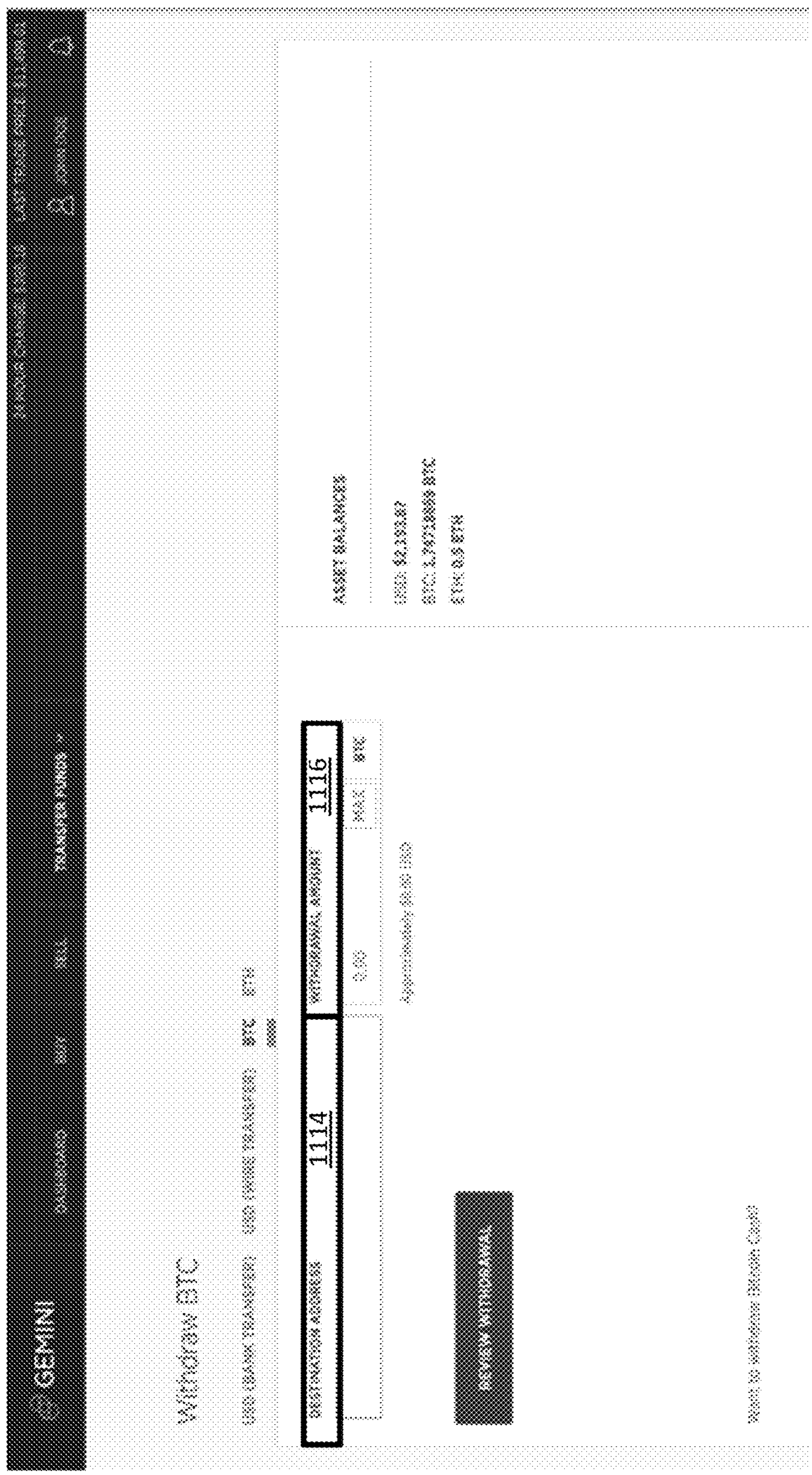
Figures 4, 11B:
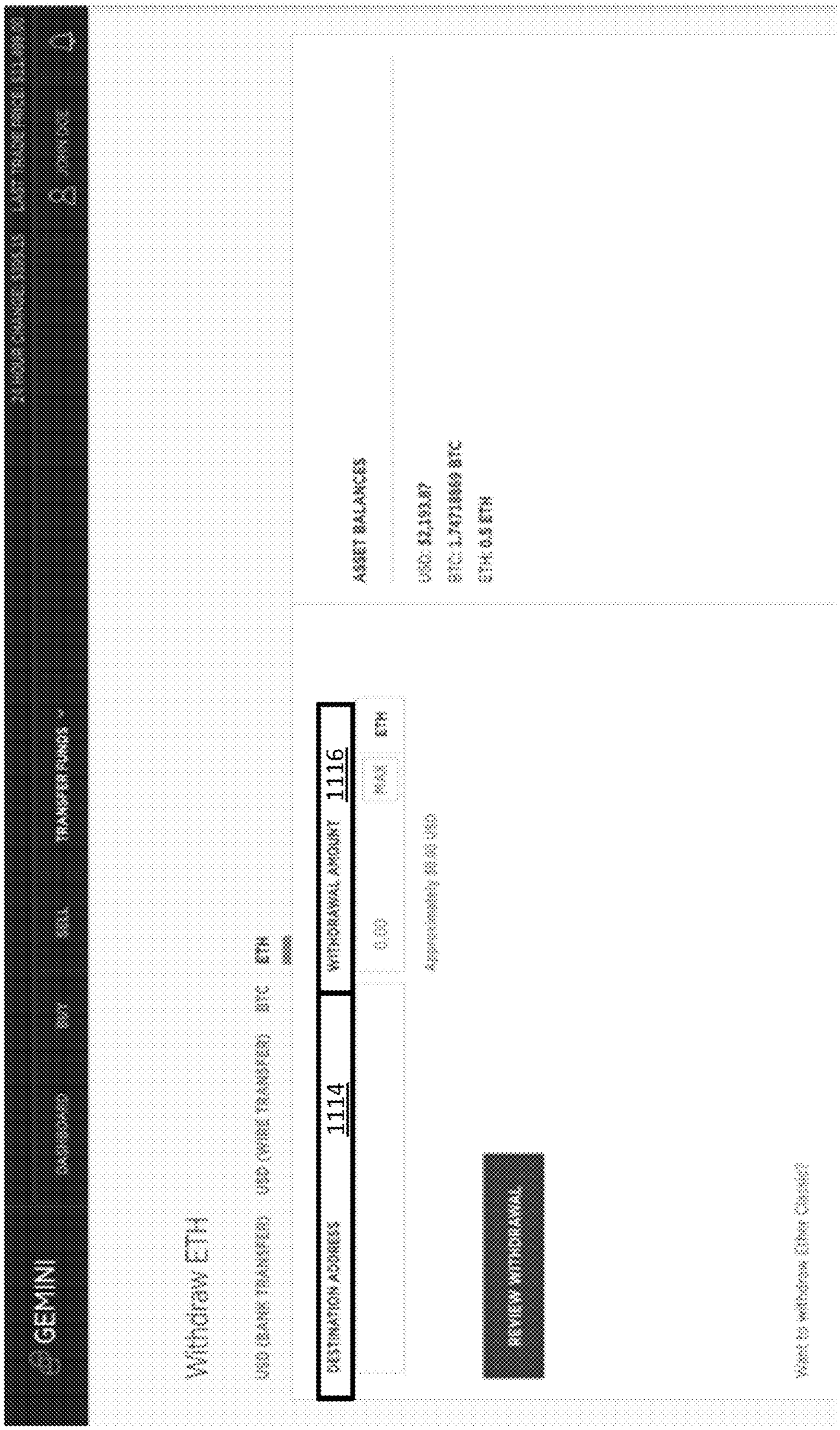
Figures 1, 11C:
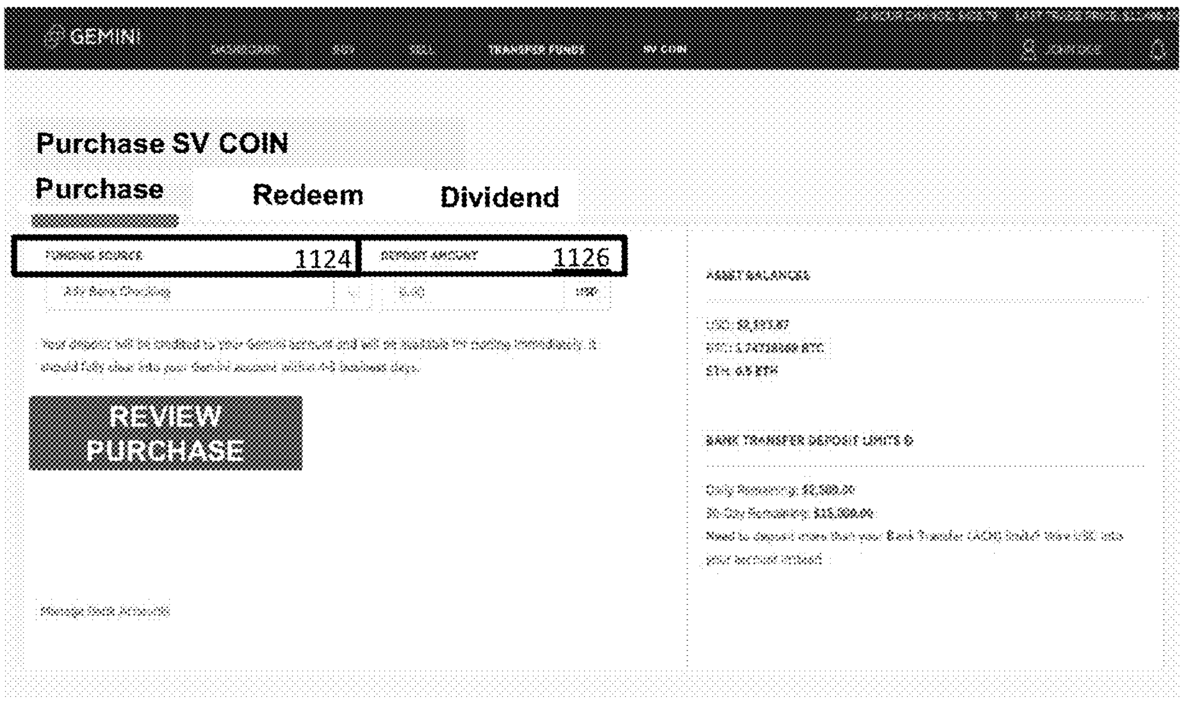
Figures 2, 11C:
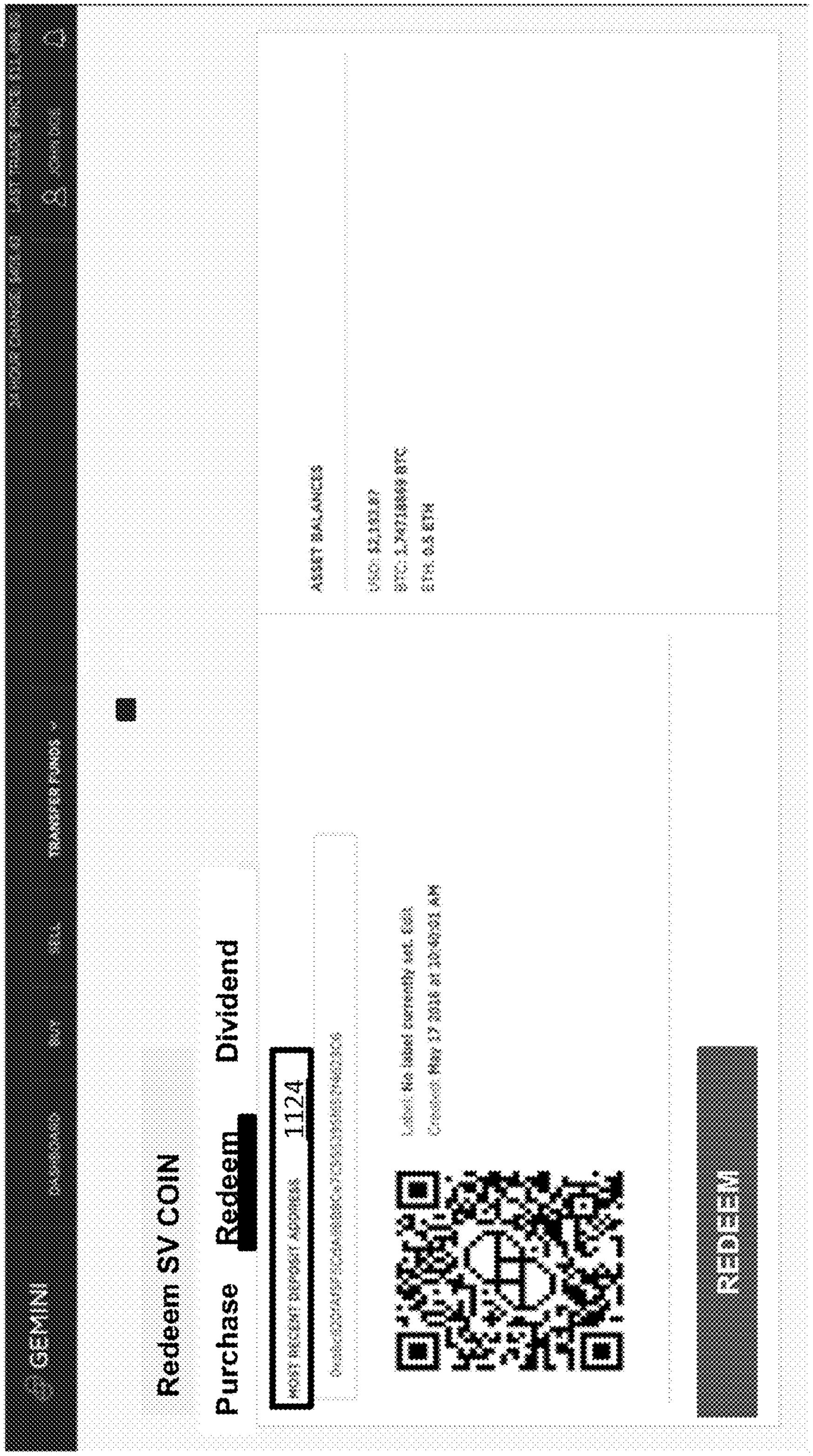
Figure 103:
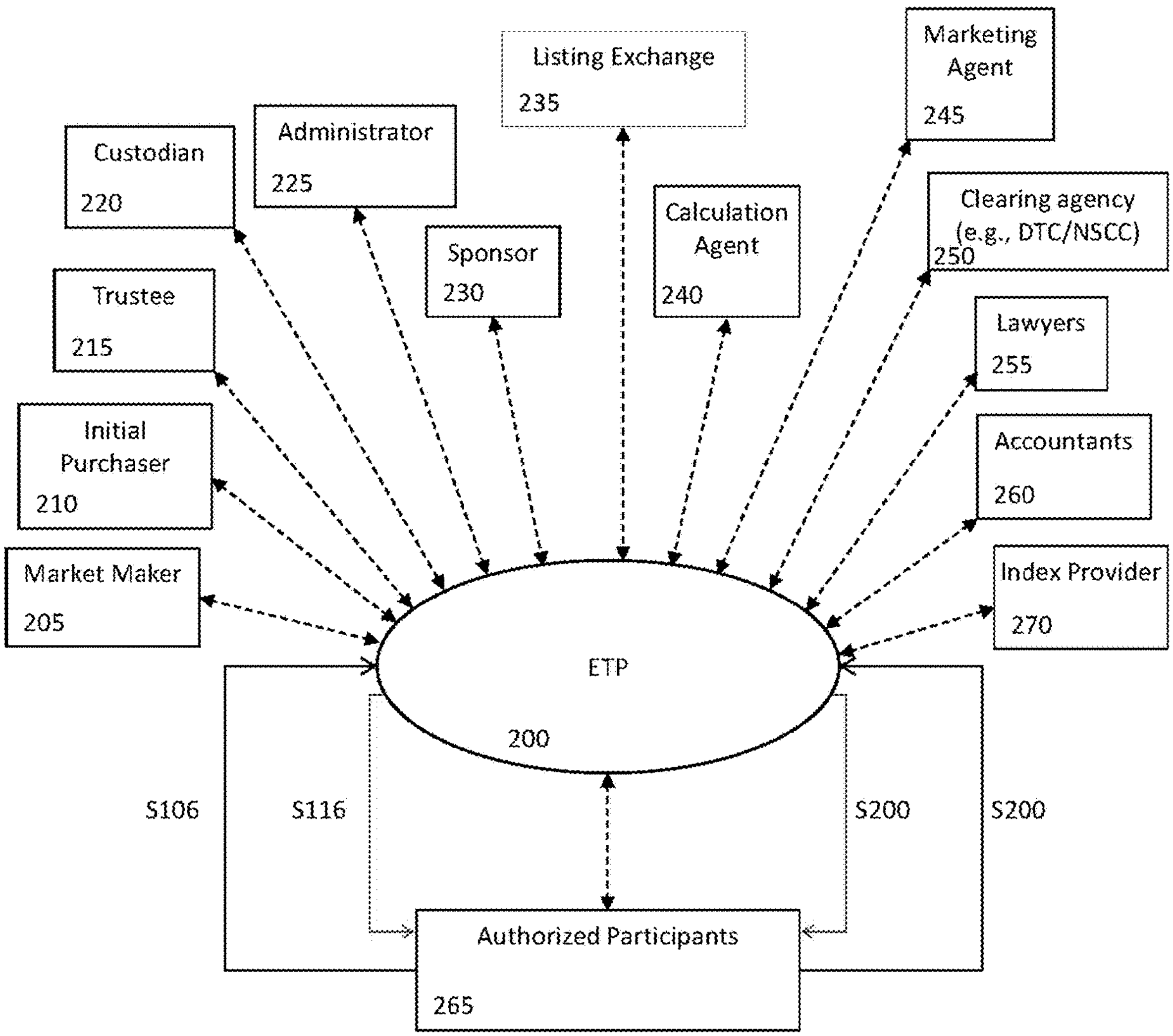
Figure 104A:
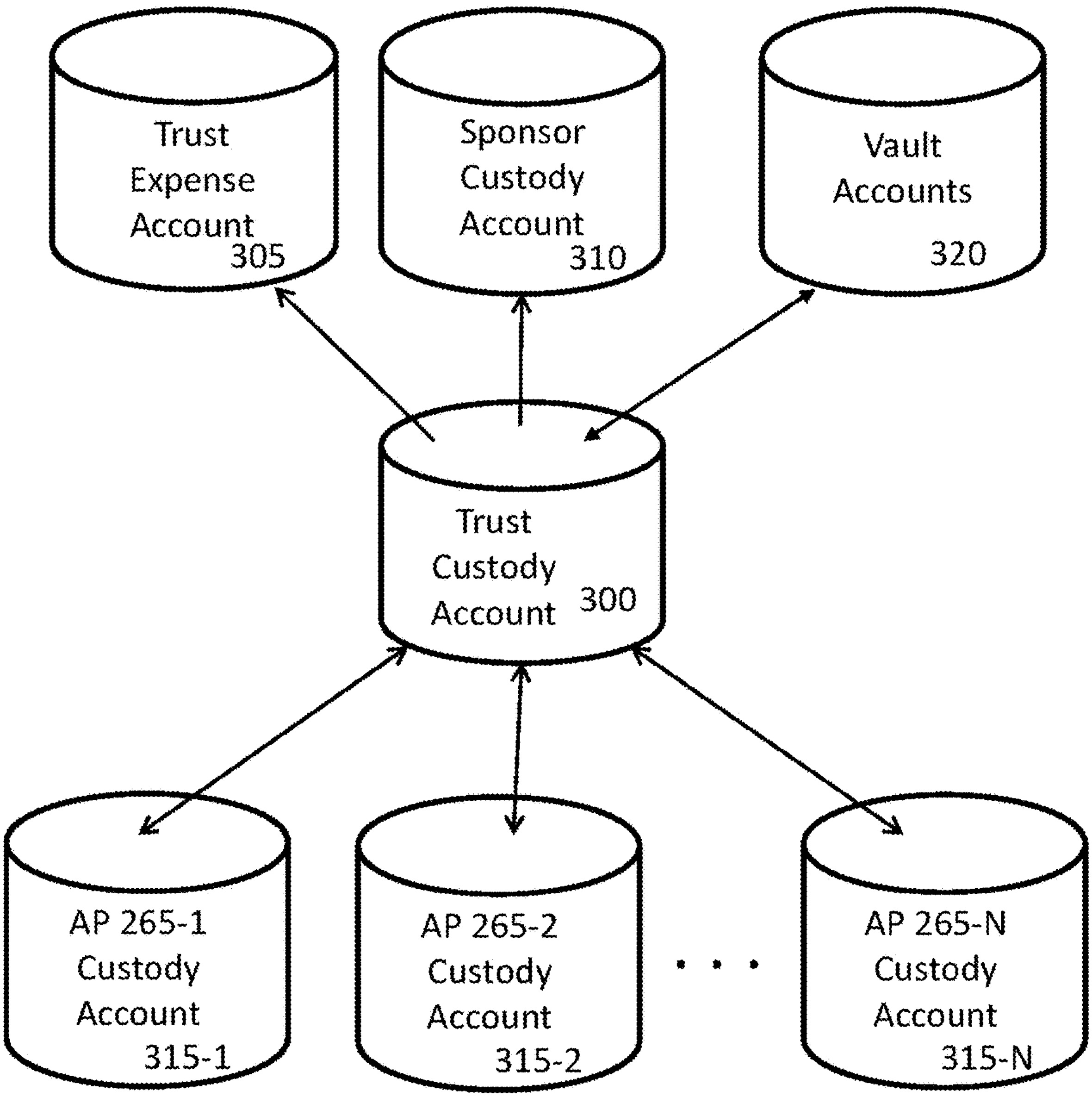
Figure 104B:
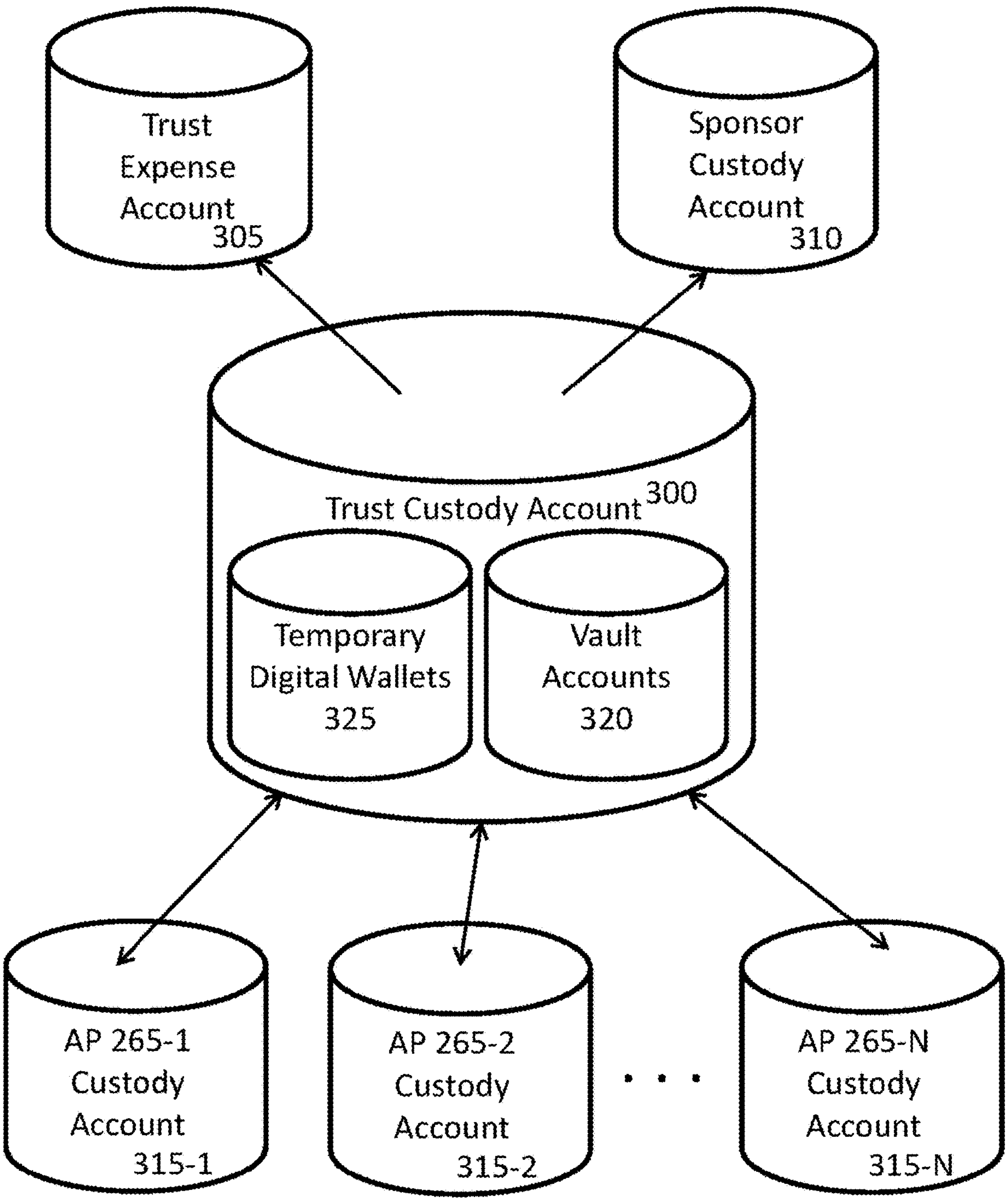
Figure 105:
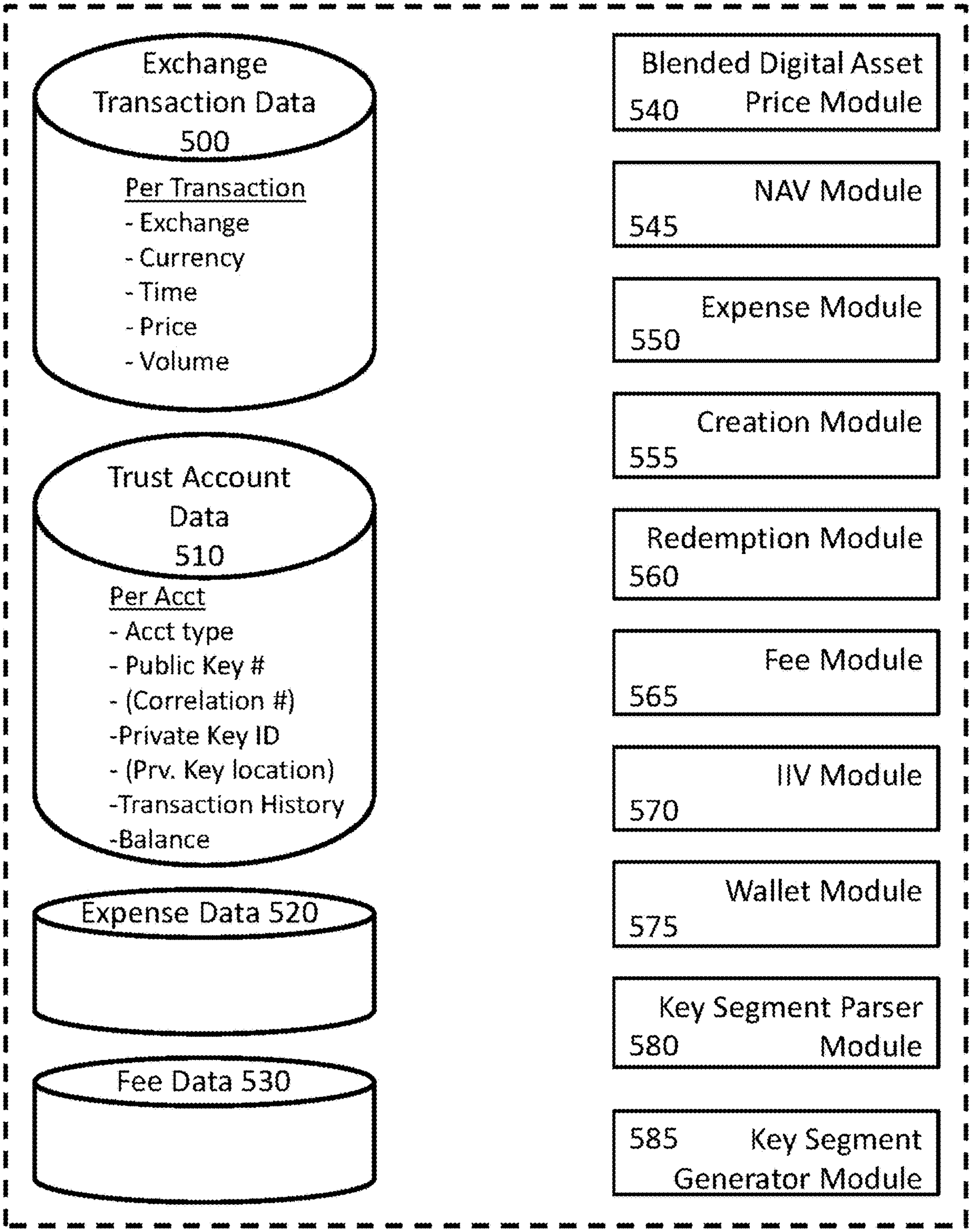
Figure 106A:
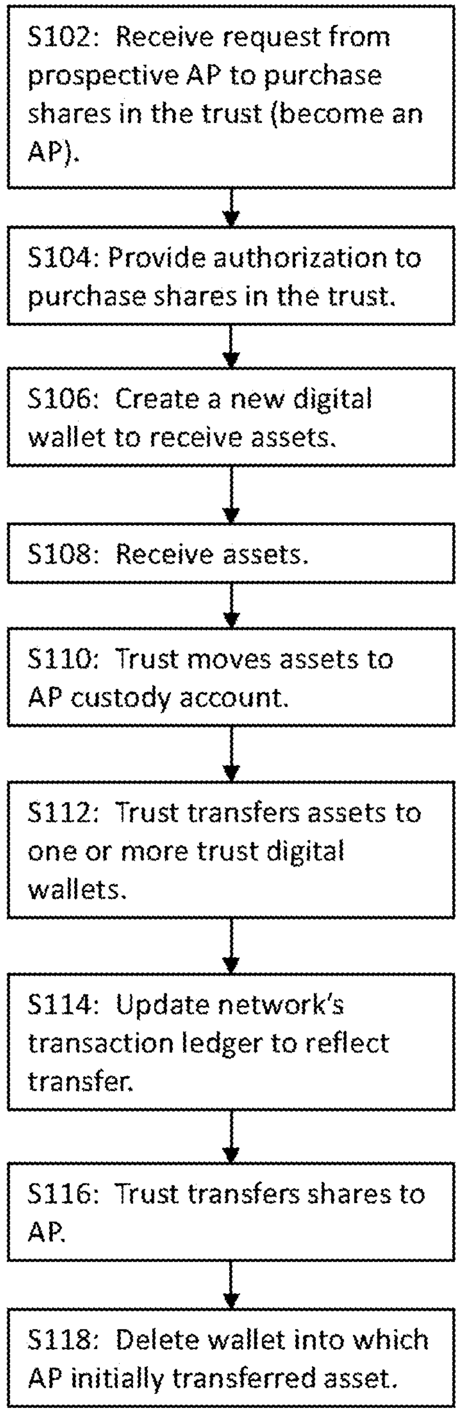
Figure 106B:
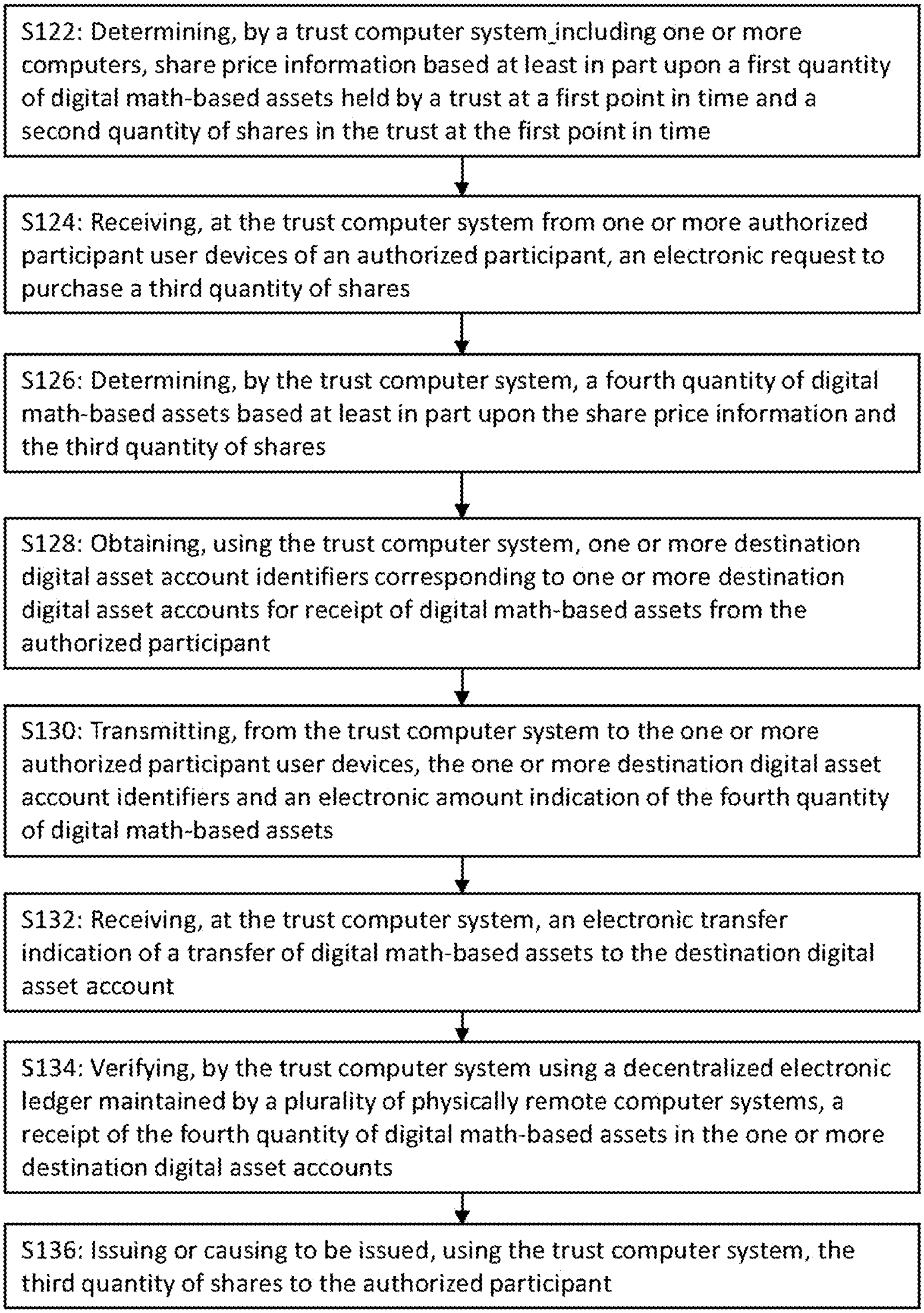
Figure 107A:
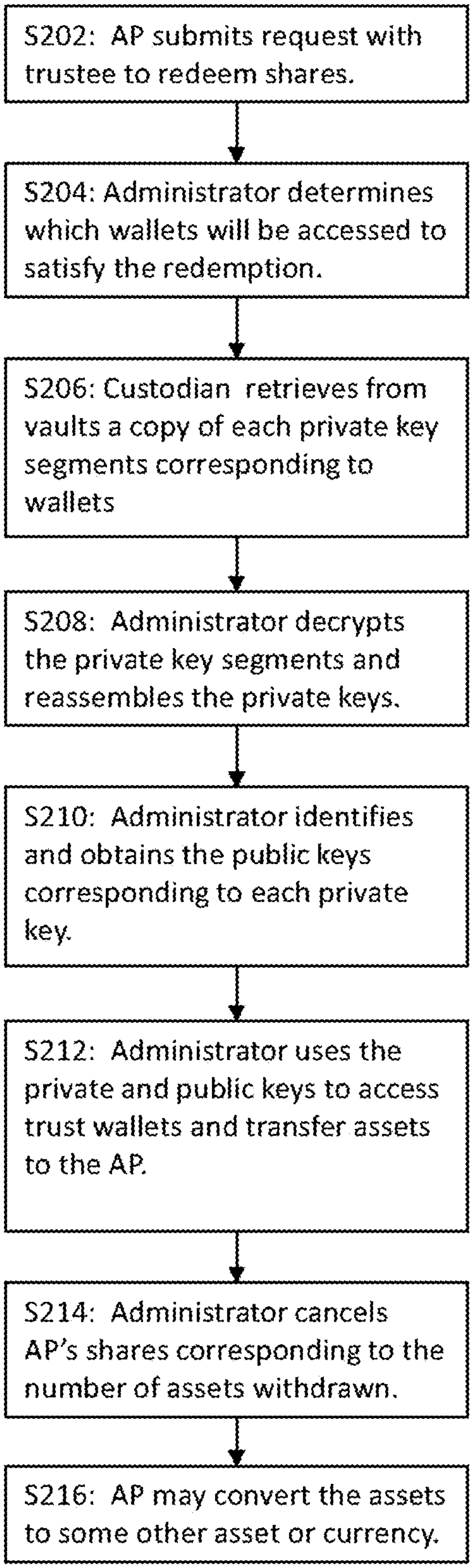
Figure 107B:
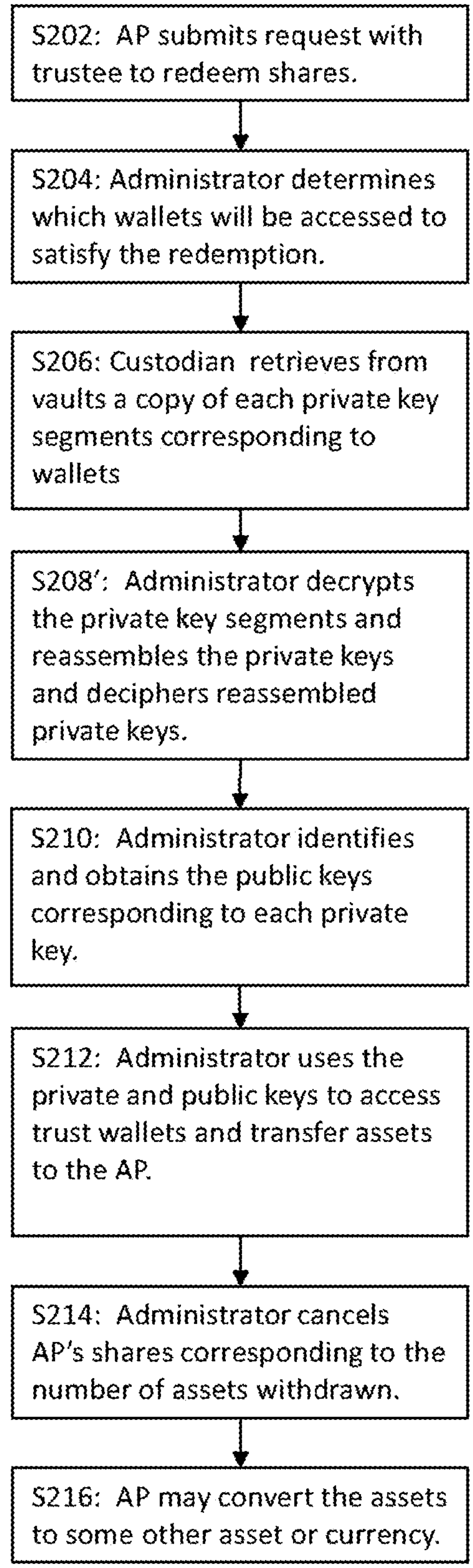
Figure 108A:
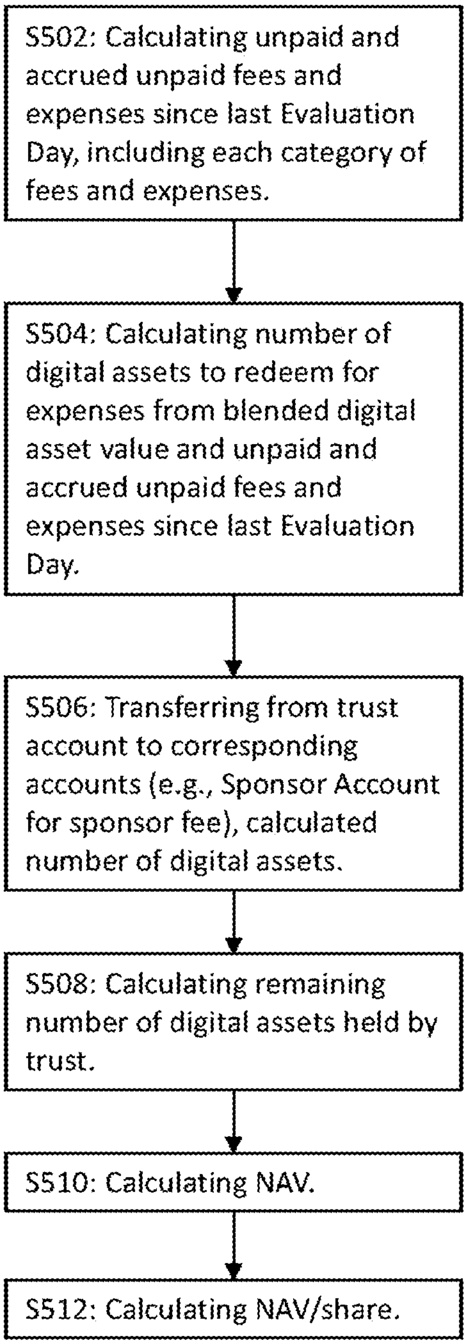
Figure 108B:
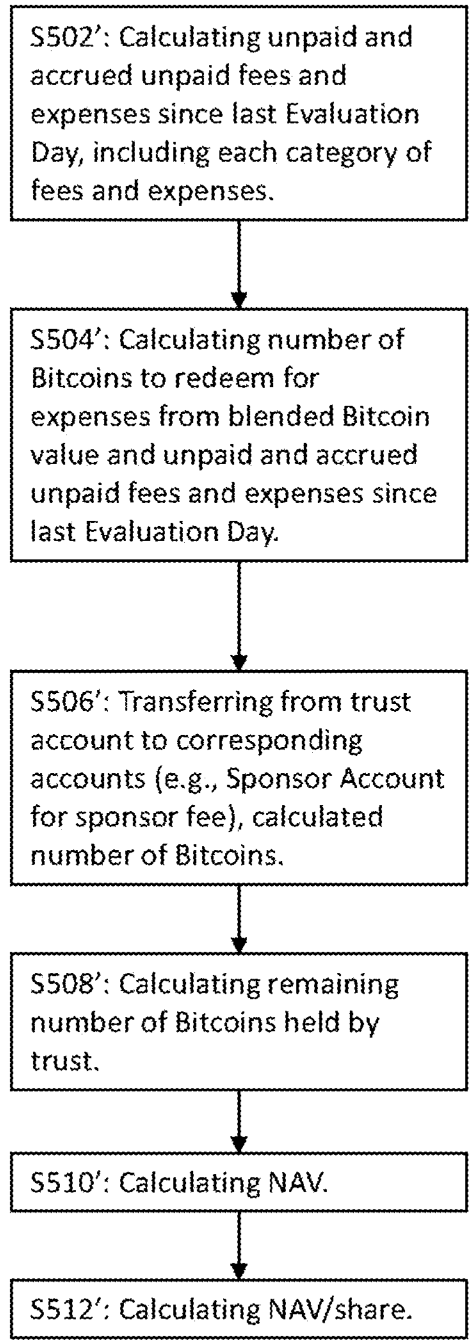
Figure 112A:
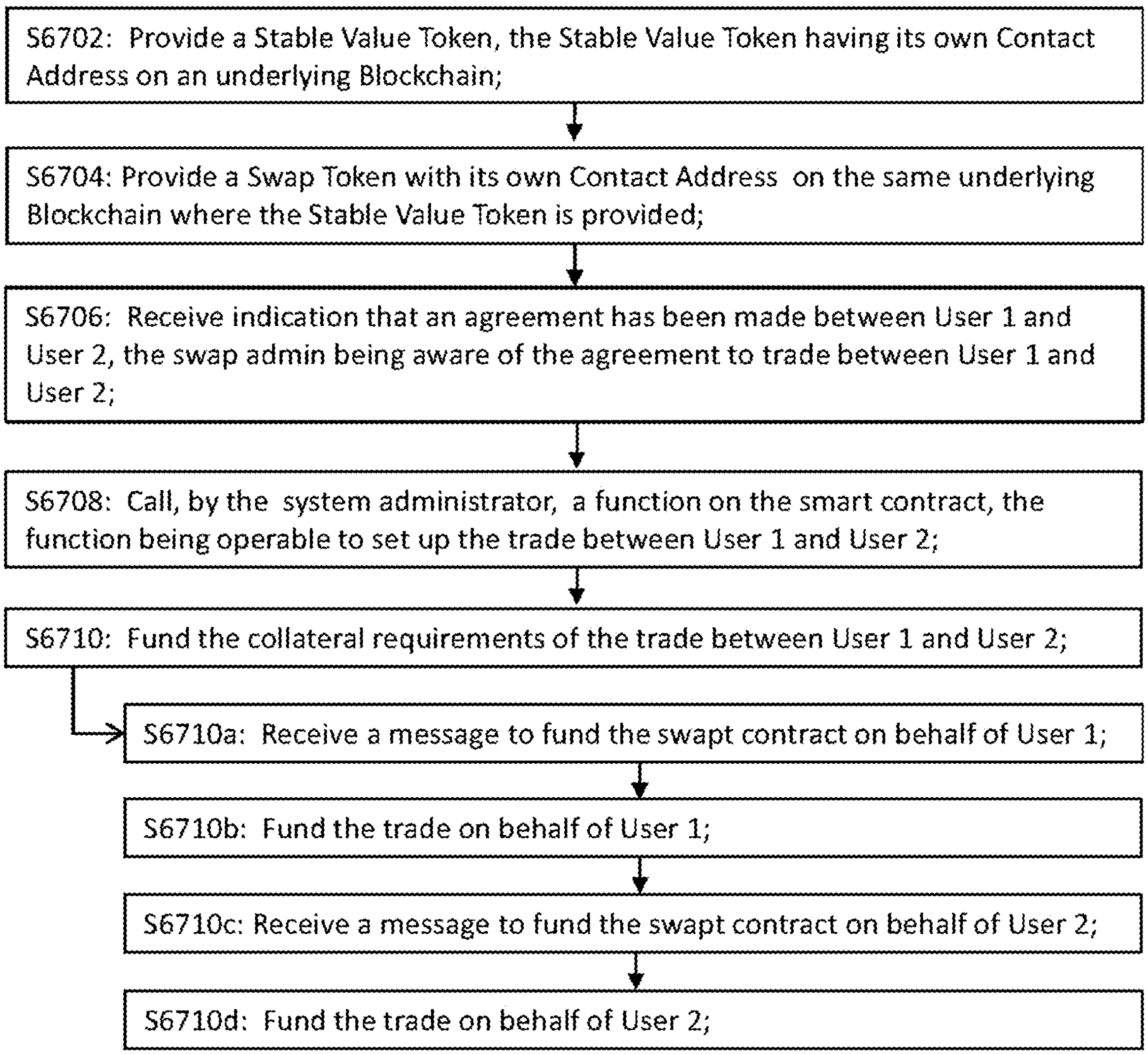
Figure 112B:
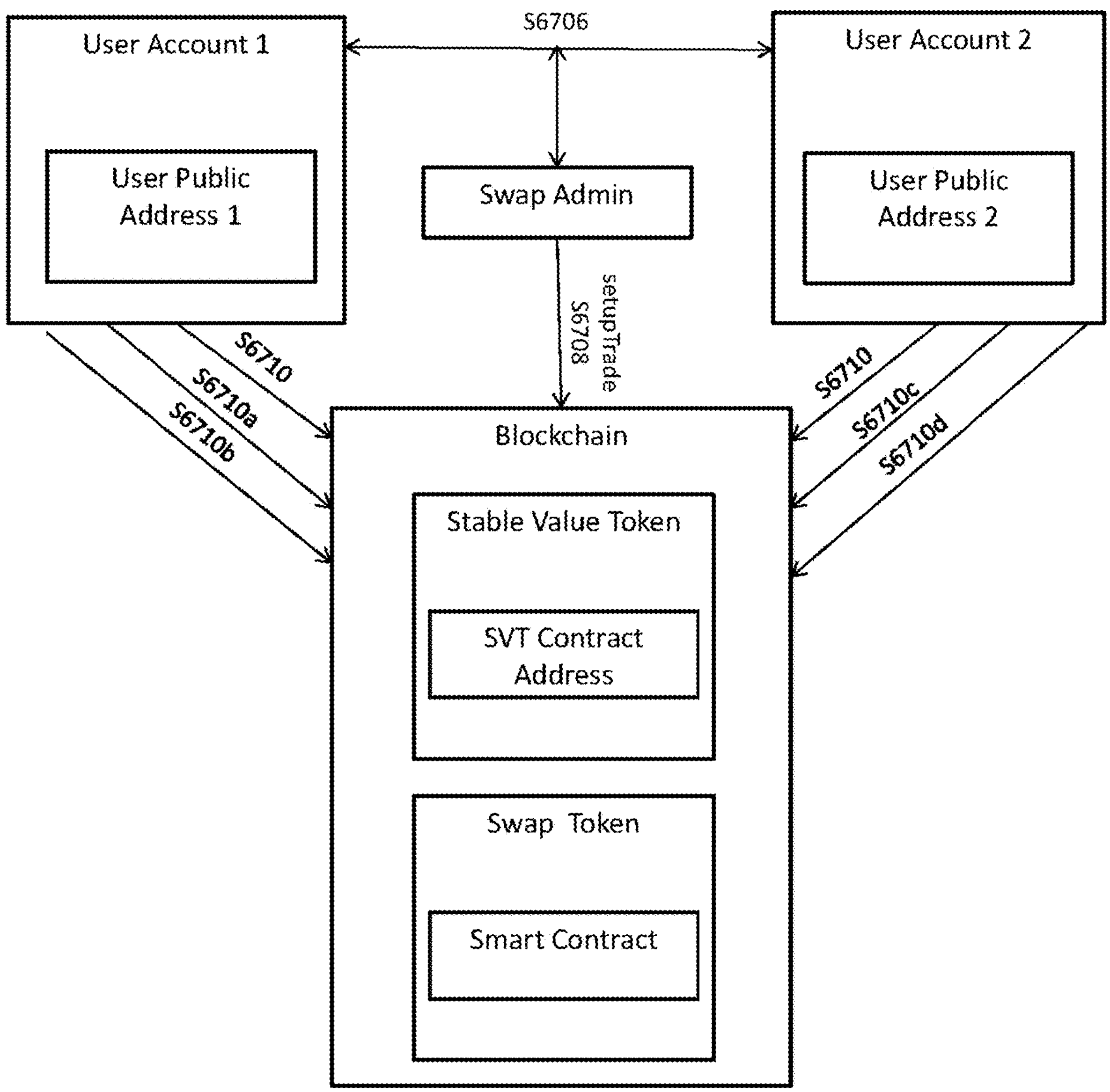
Figure 113A:
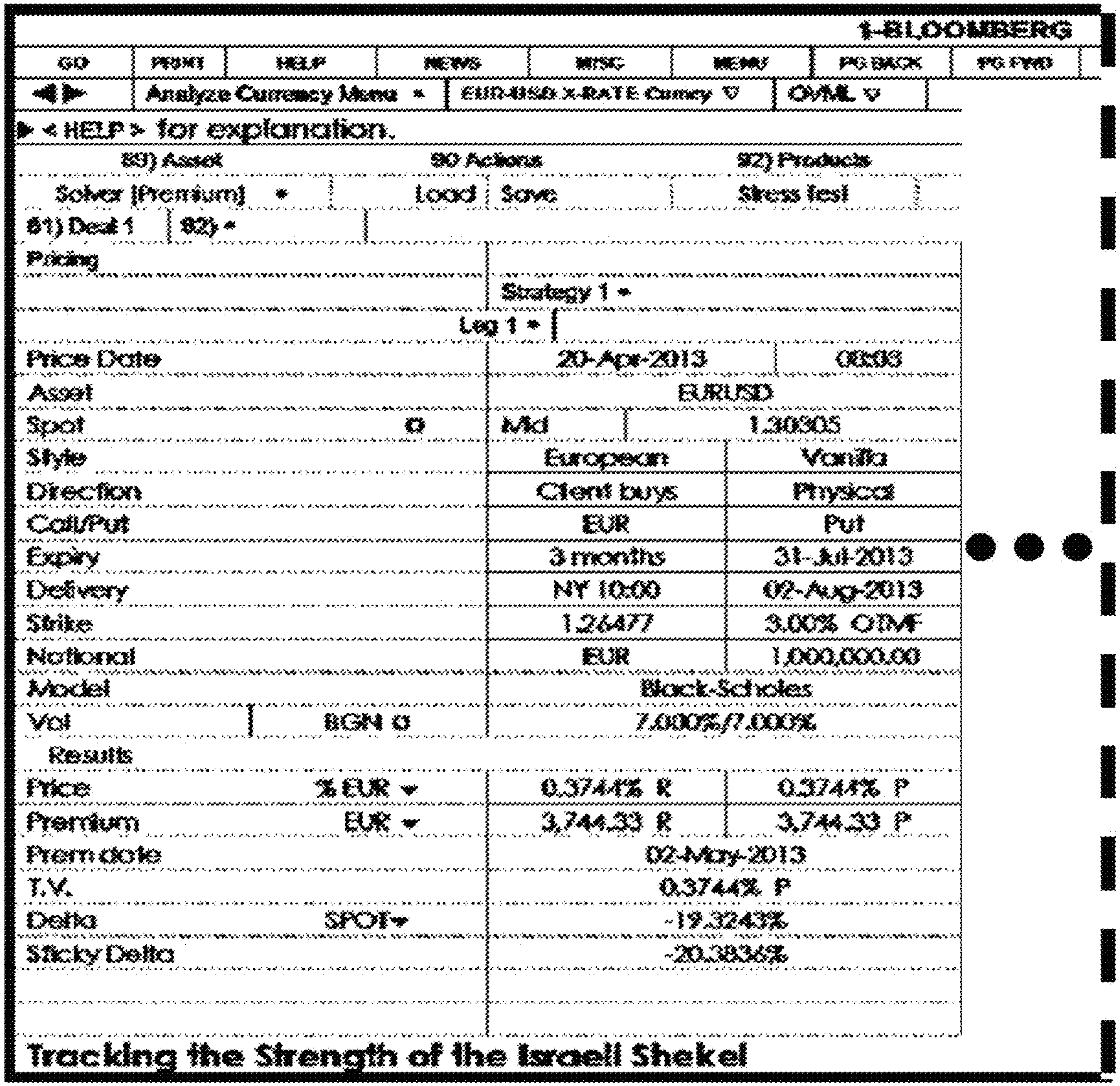
Figure 113B:
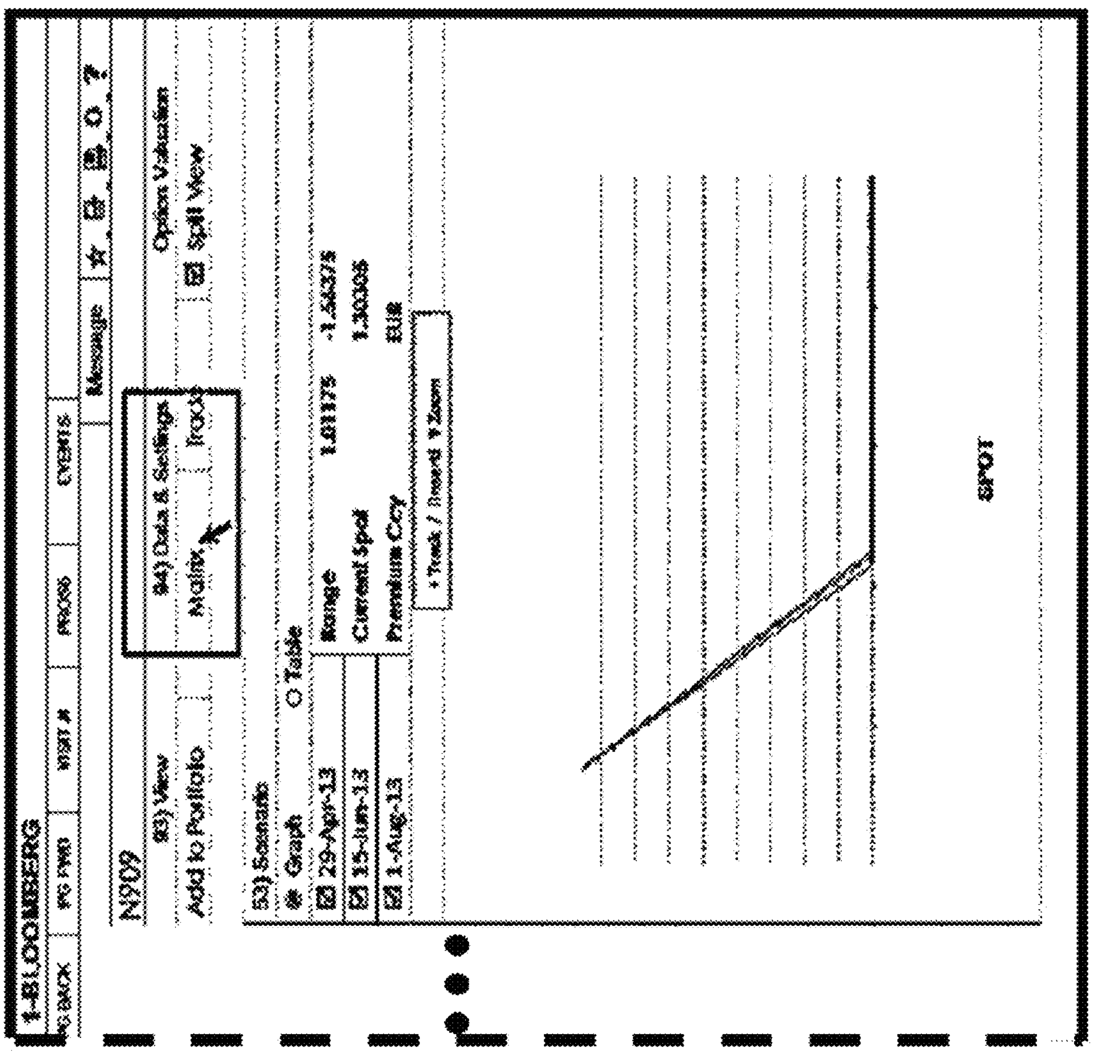
Figure 115:
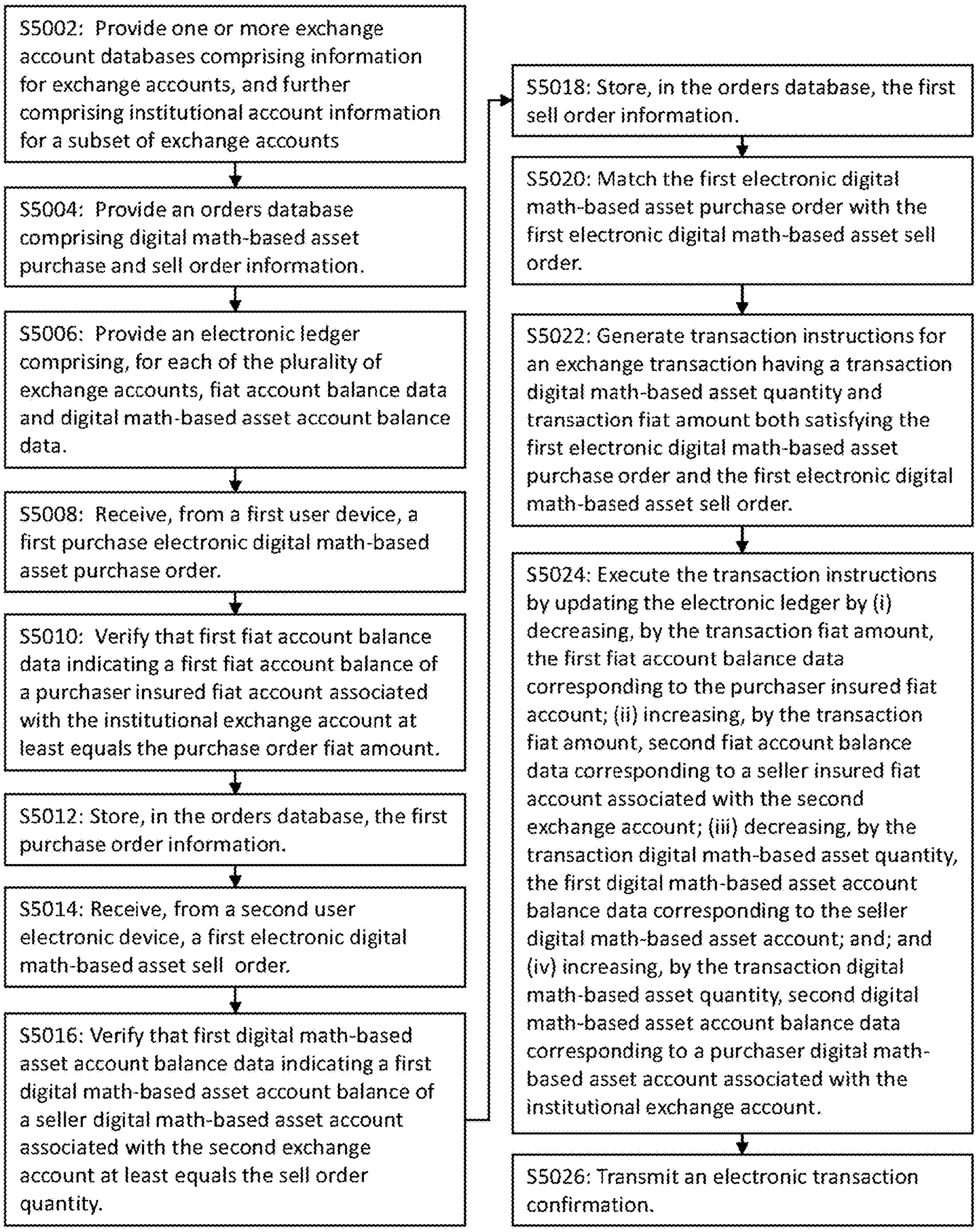
Figure 116:
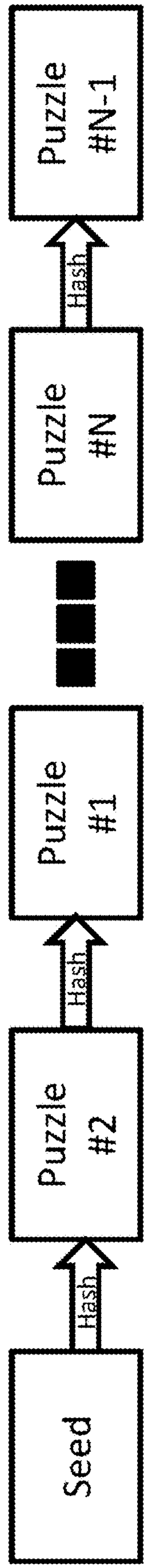
Figure 117A:
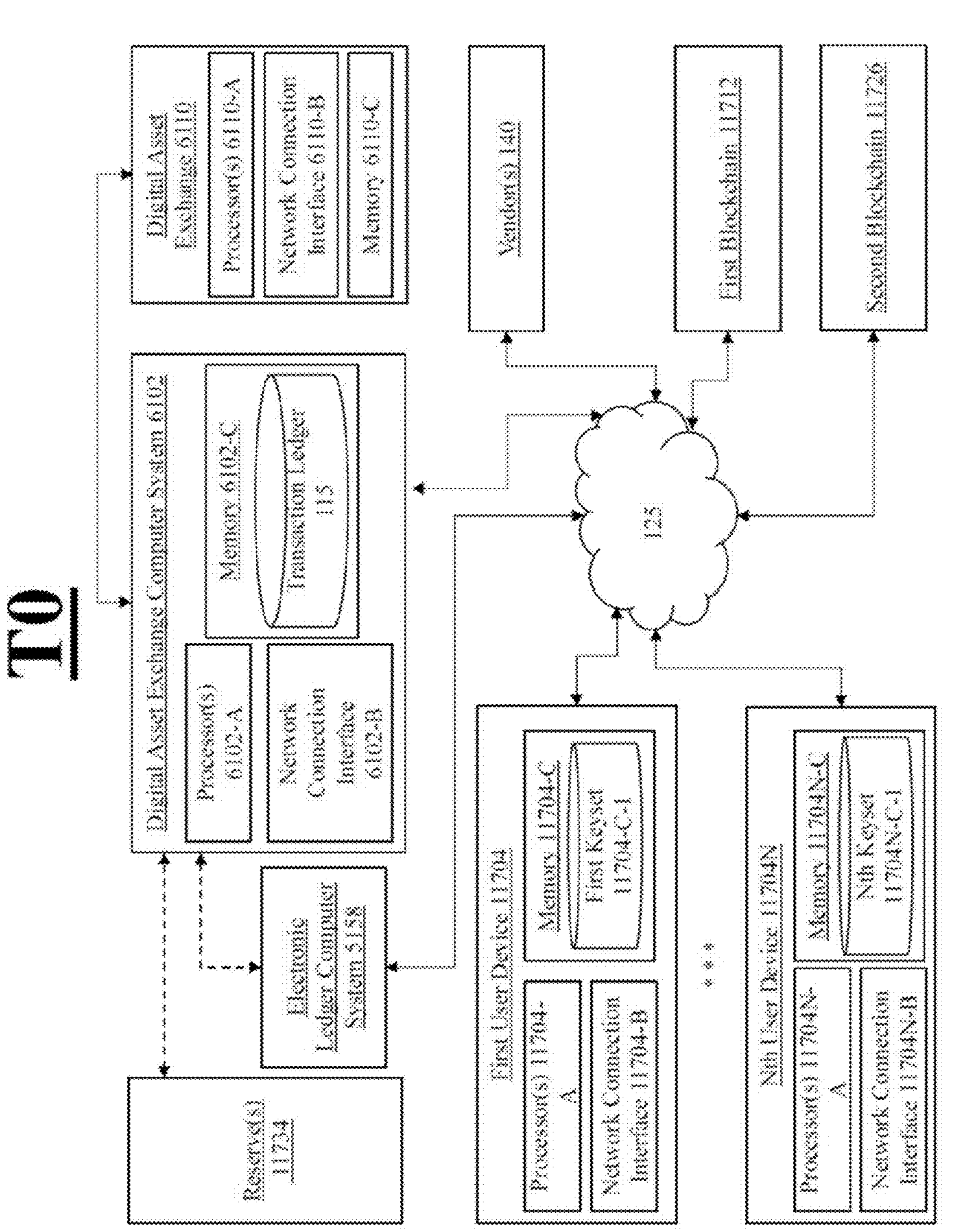
Figures 2, 117B:
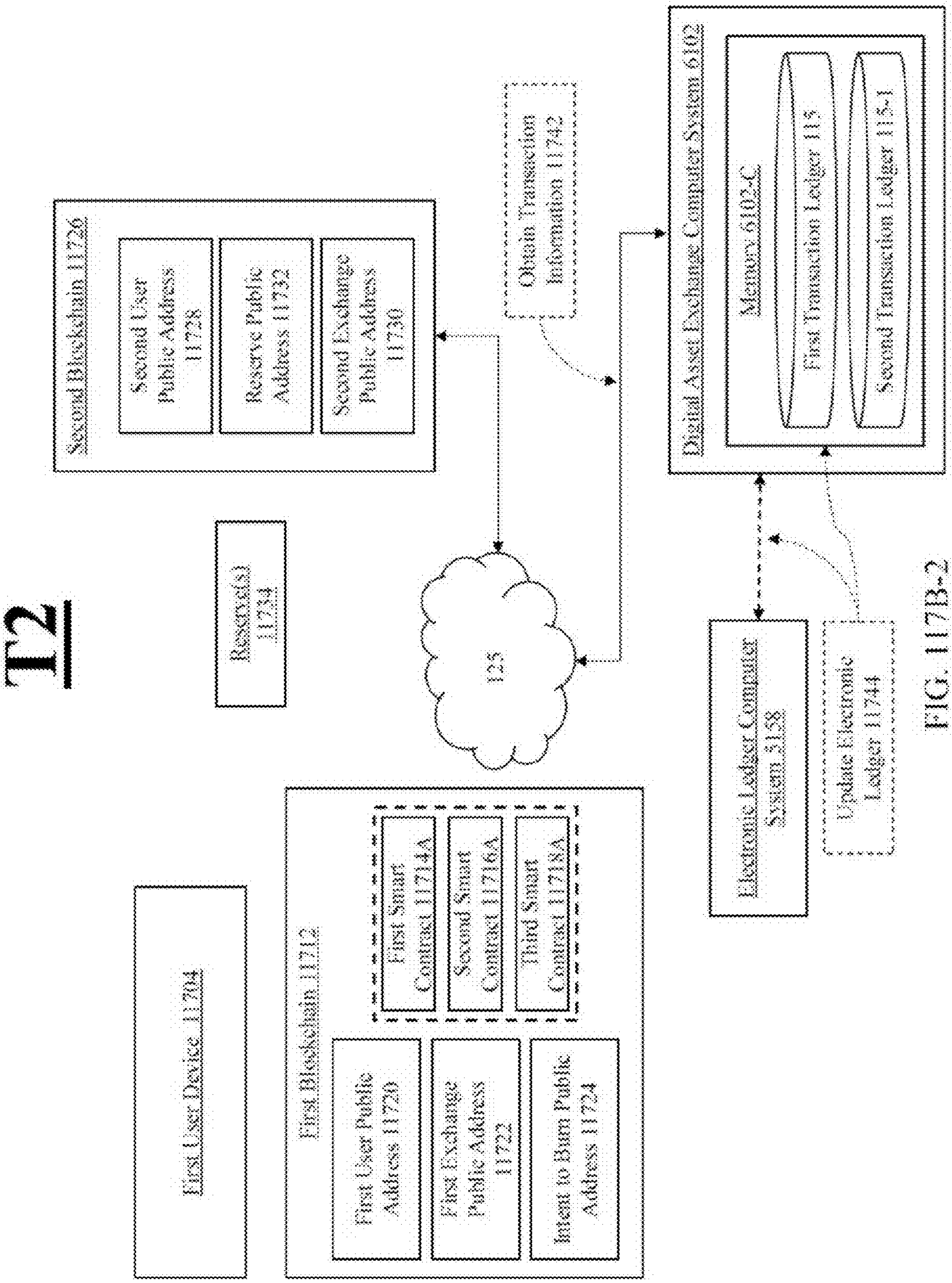
FIG. 2 is an exemplary screen shot of an excerpt of an exemplary BITCOIN transaction log showing digital addresses in accordance with exemplary embodiments of the present invention.
Figures 3, 117B:
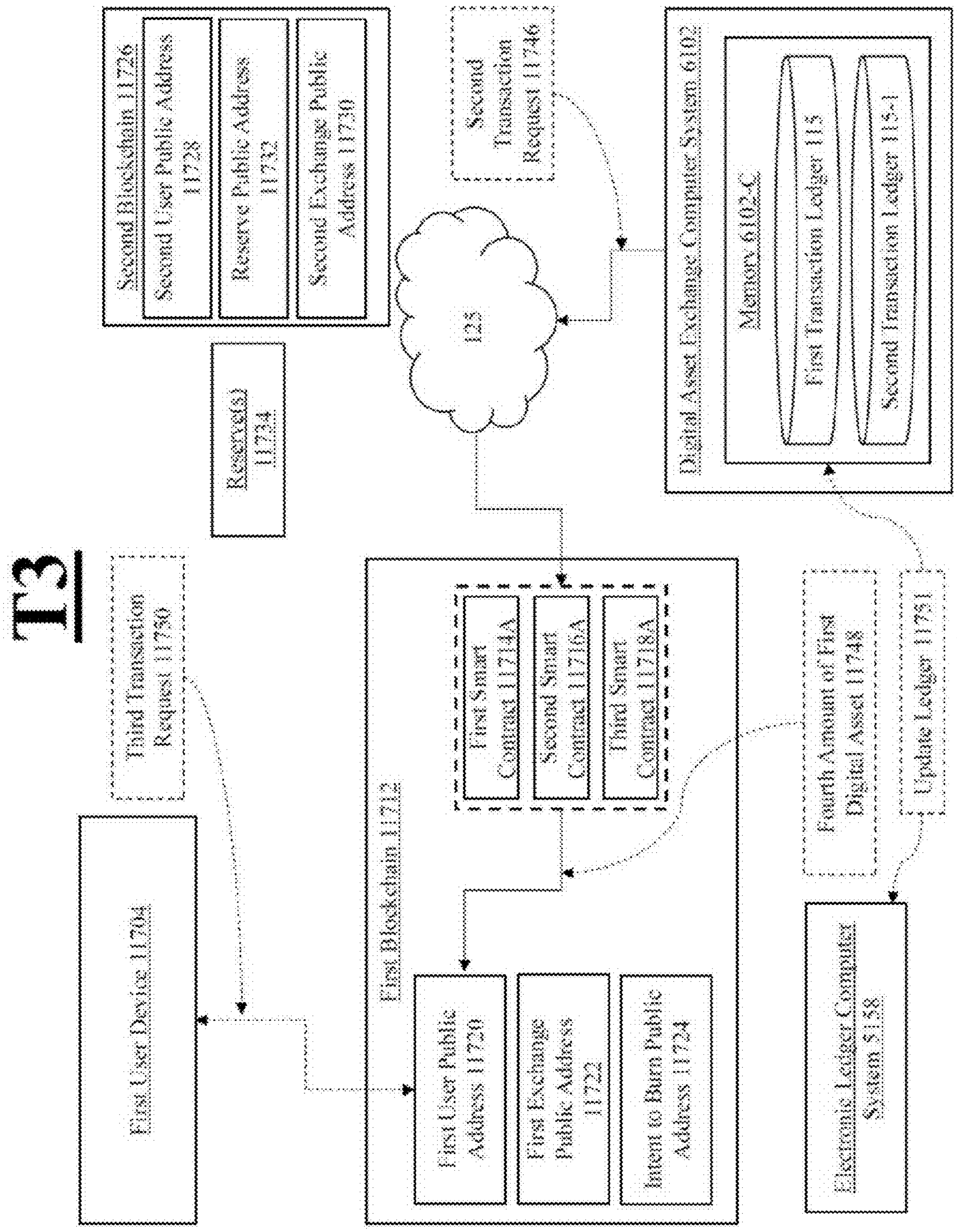
Figures 1, 117C:
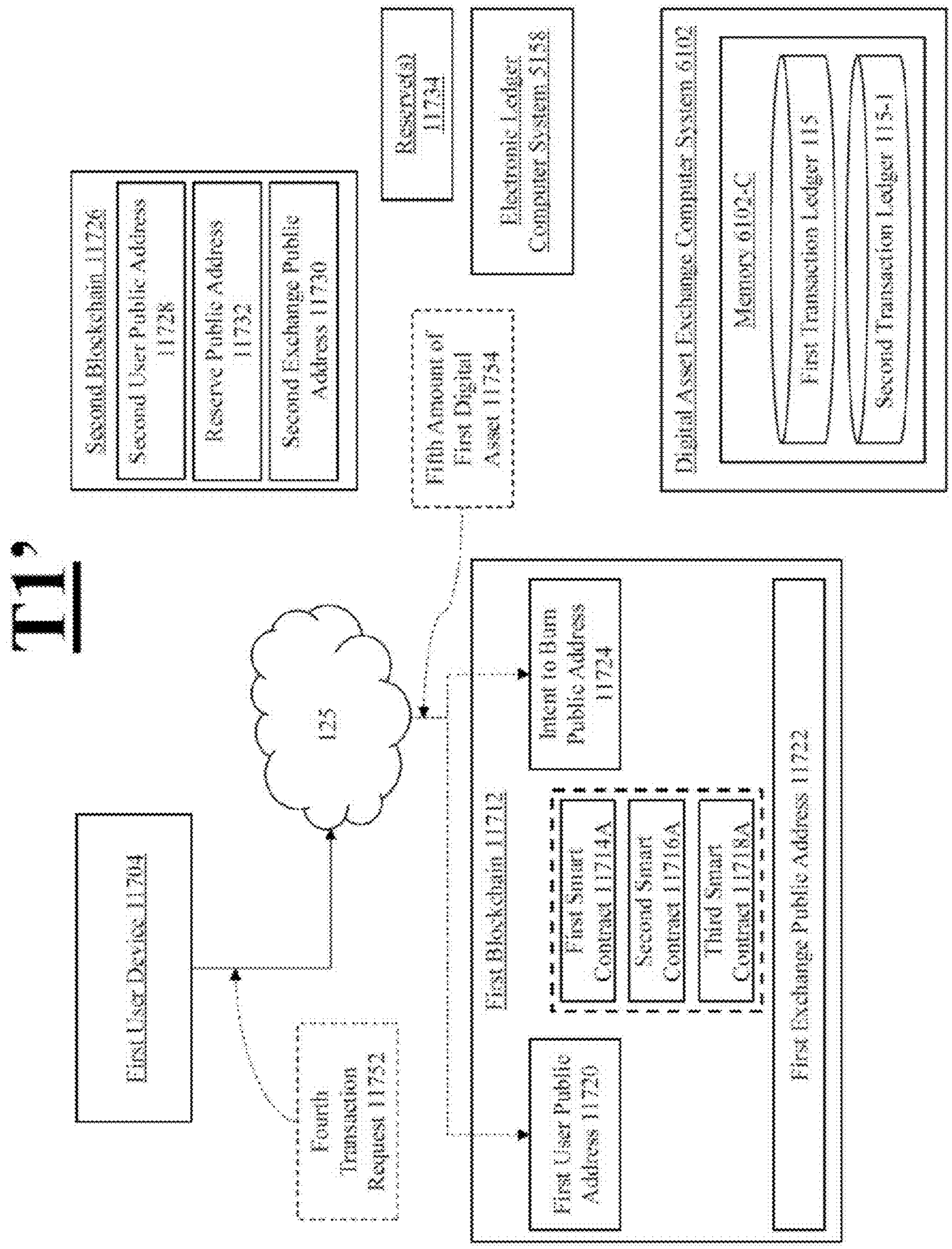
Figures 2, 117C:
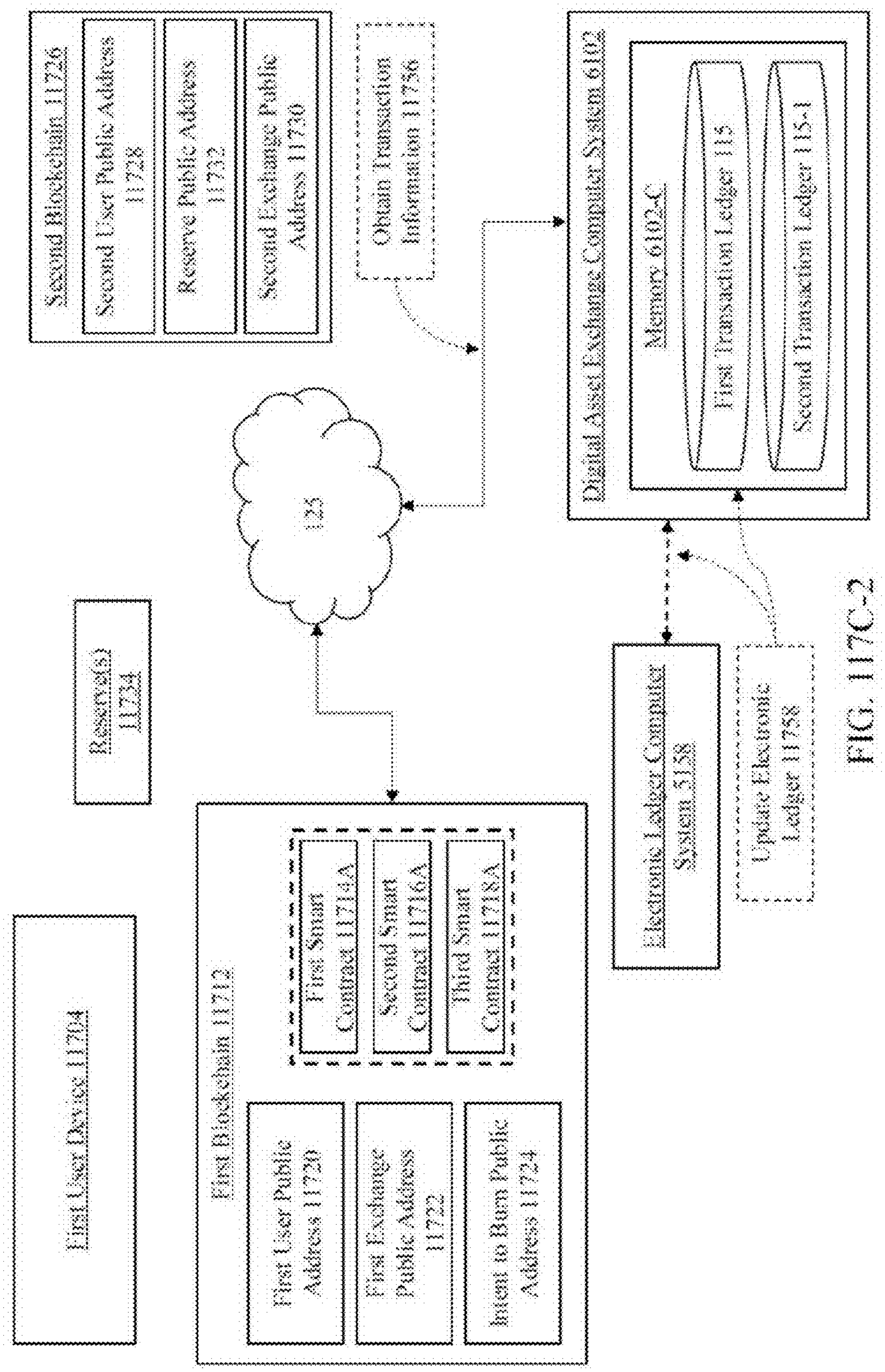
Figures 3, 117C:
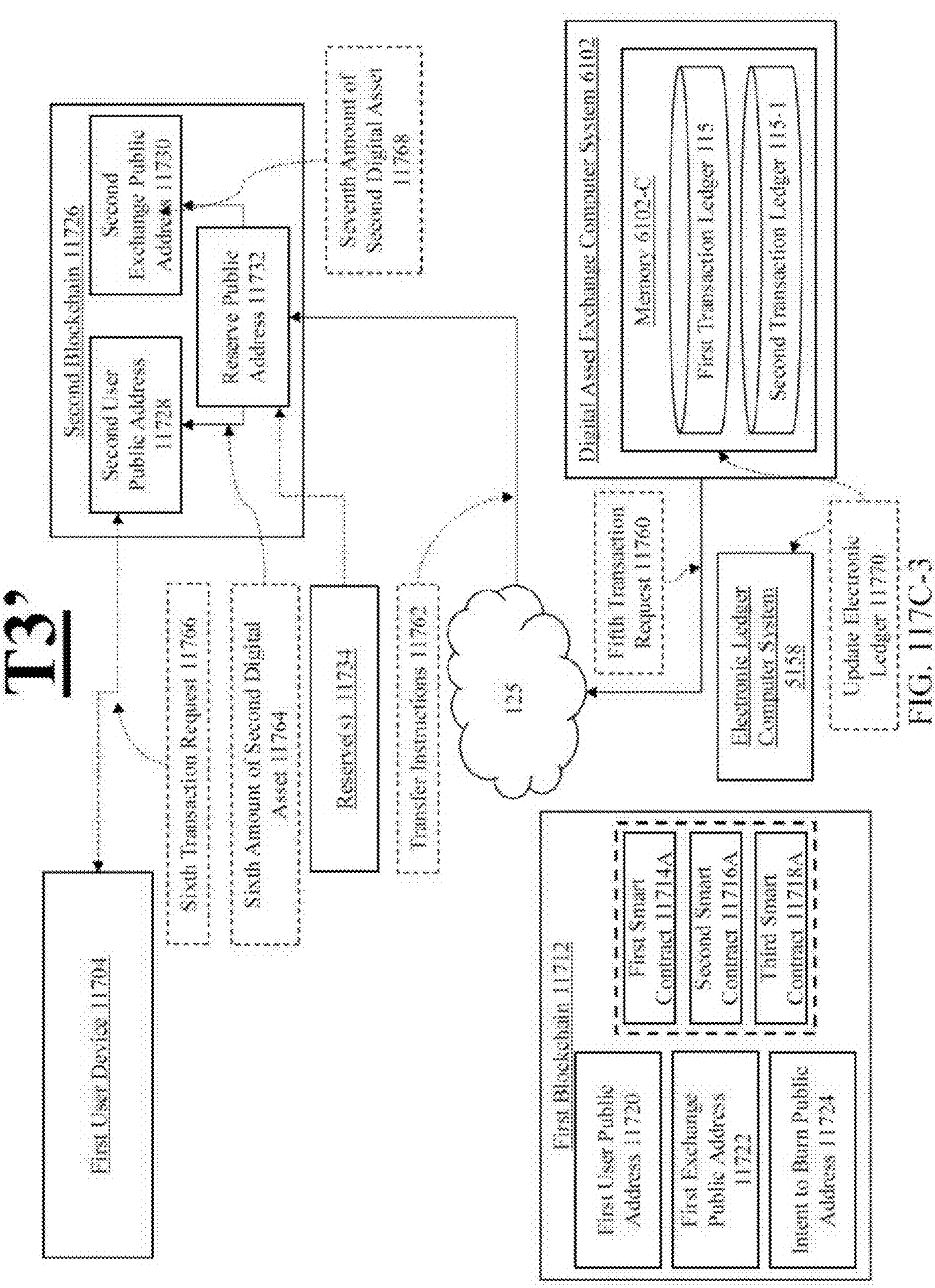
Figure 118:
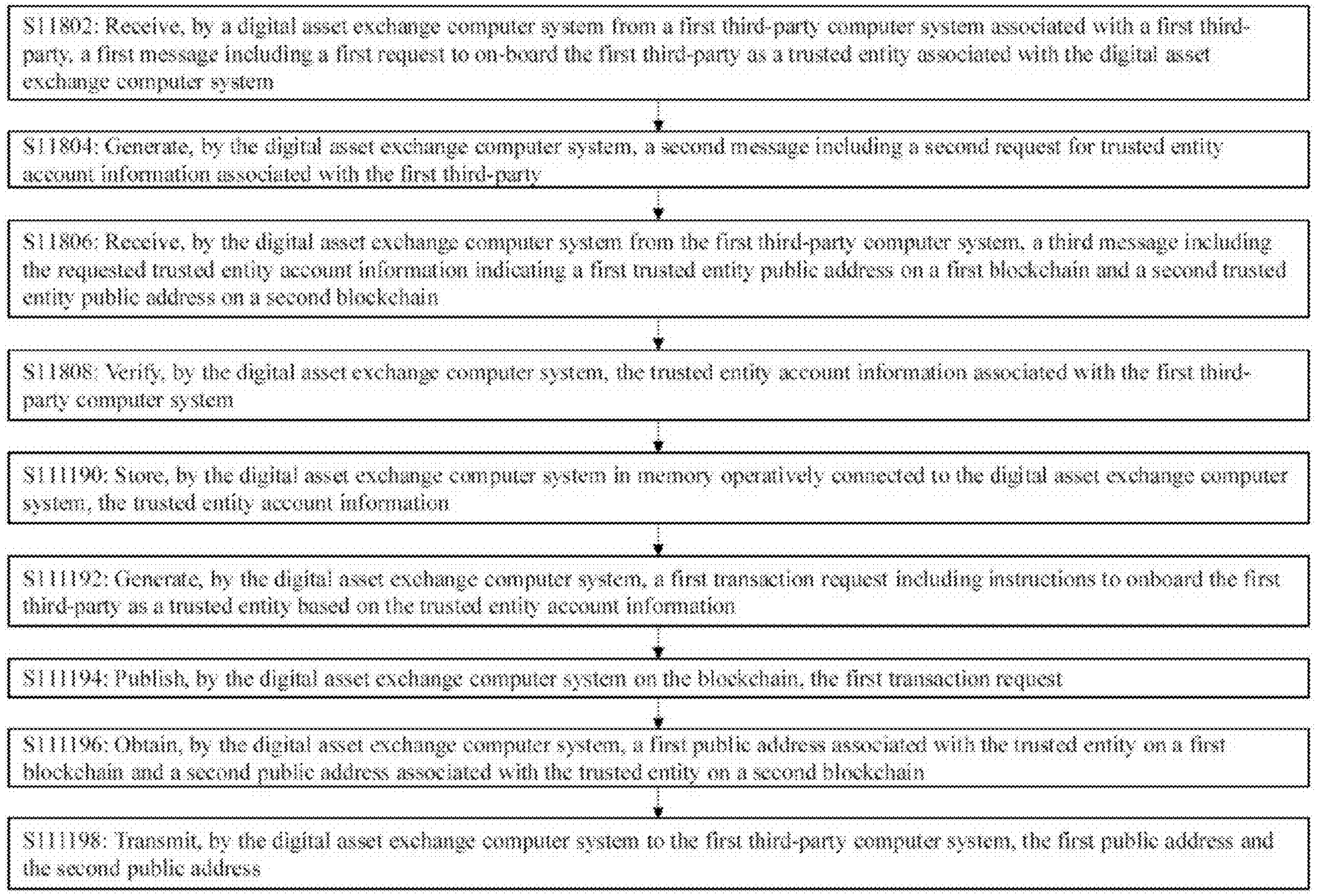
Figure 119A:
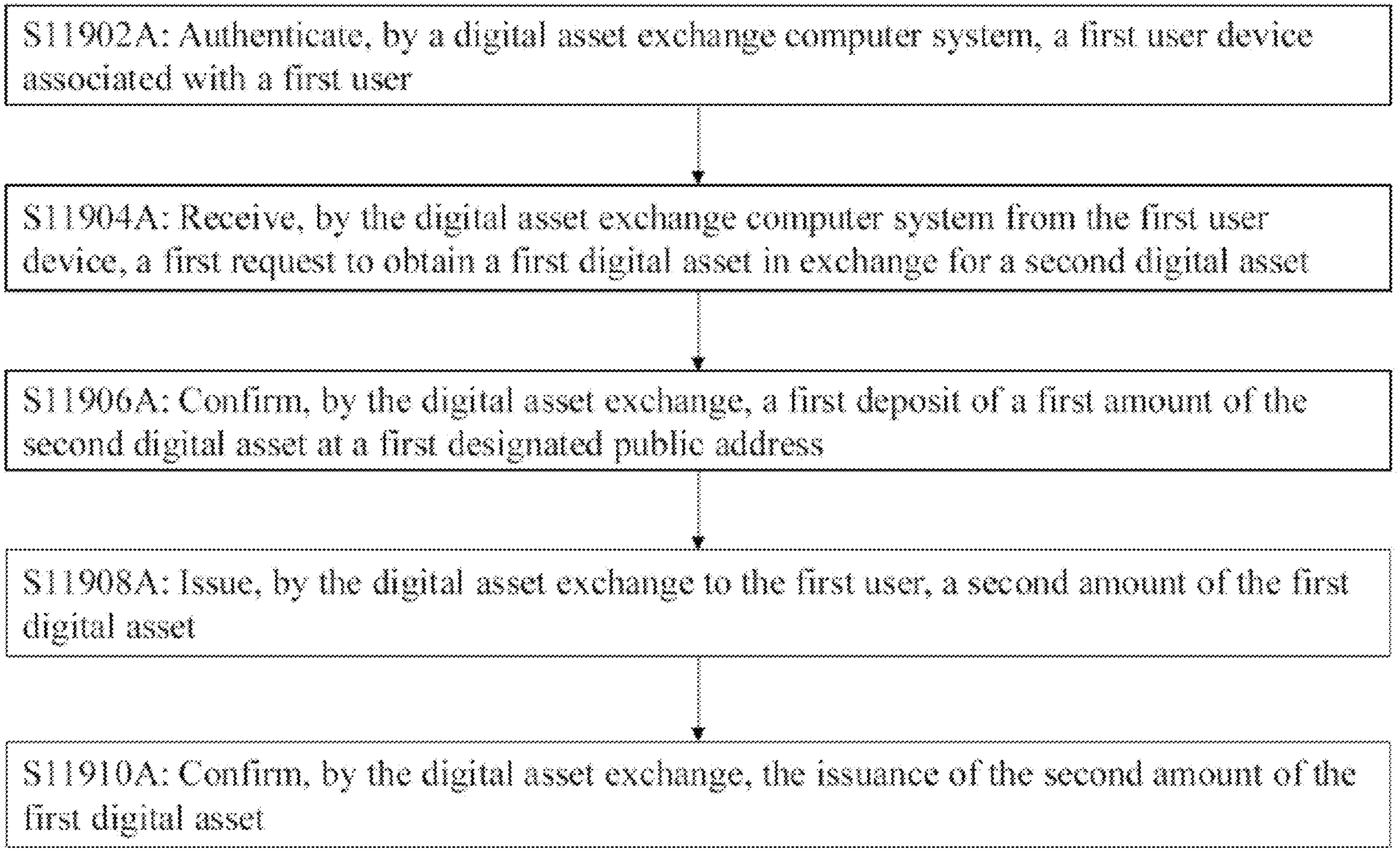
Figures 1, 119A:
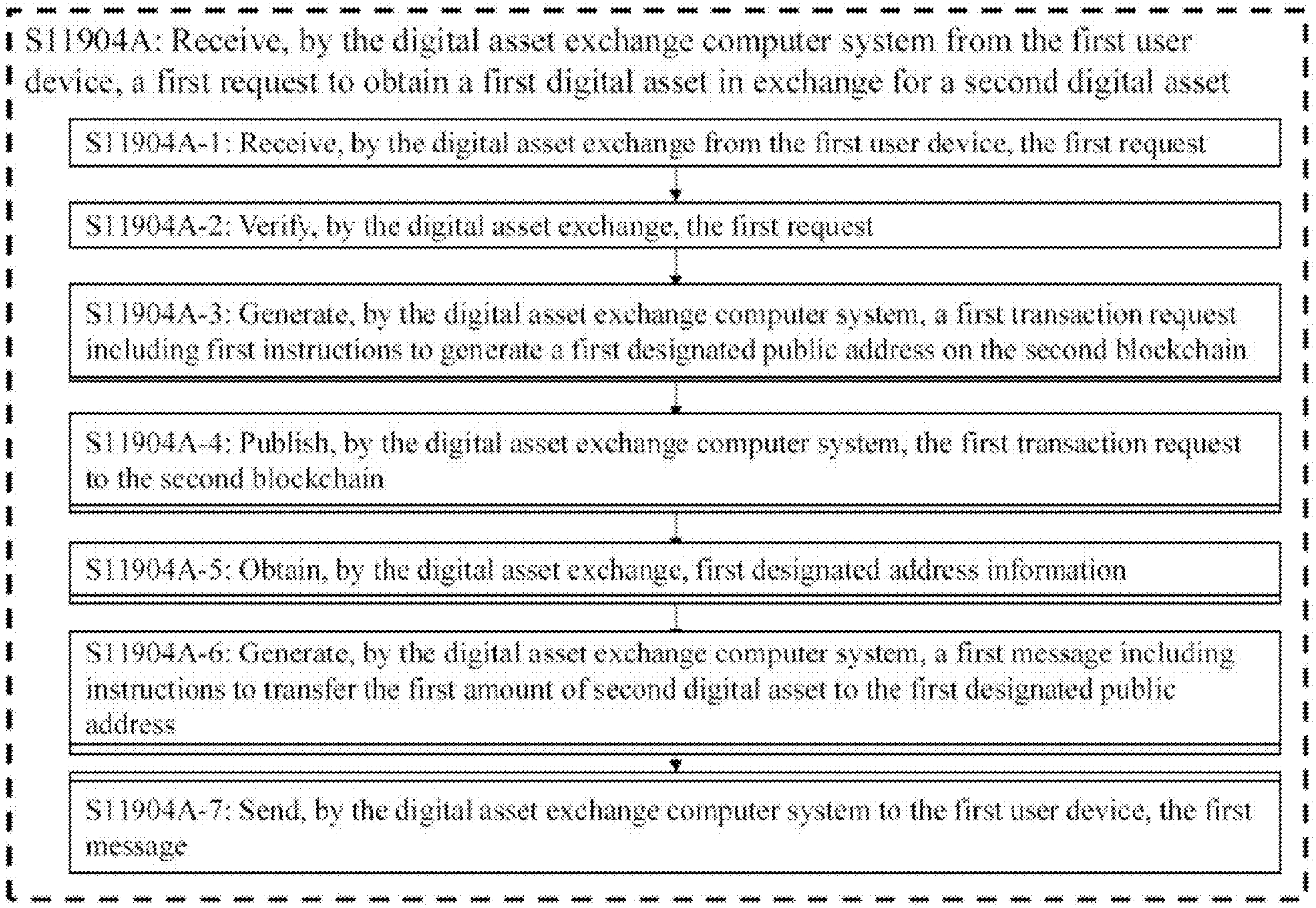
Figures 2, 119A:
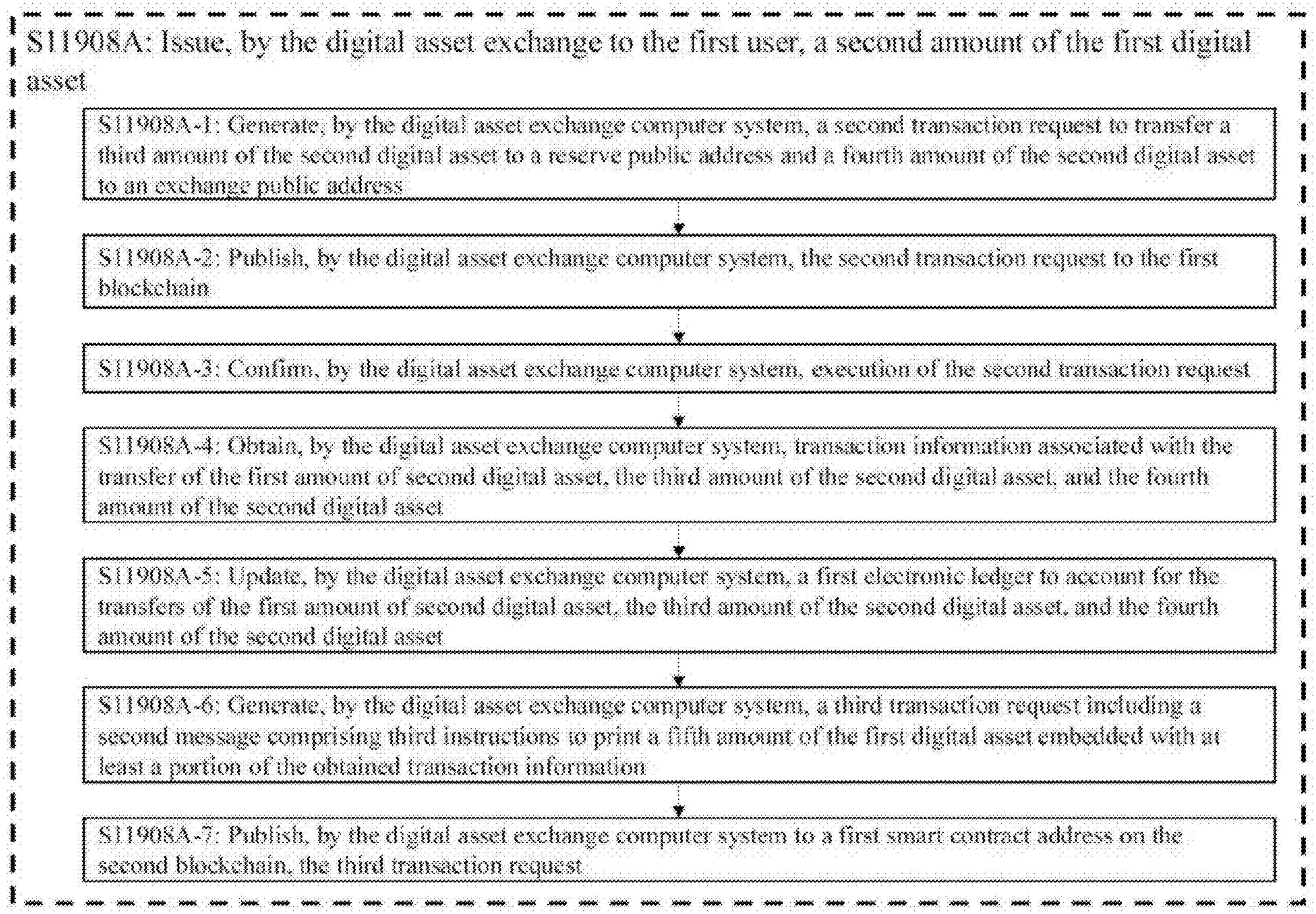
Figure 119B:
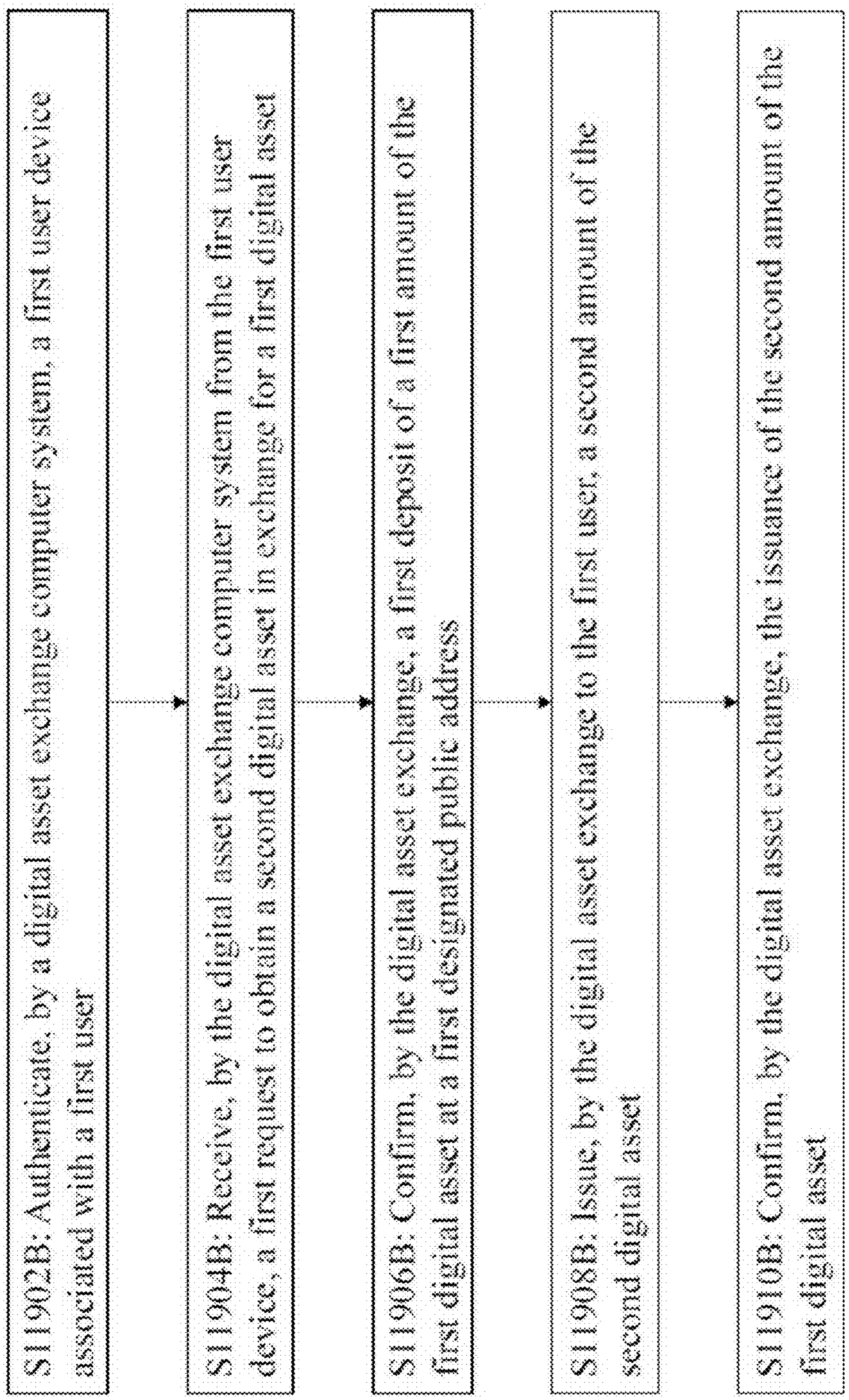
Figures 1, 119B:
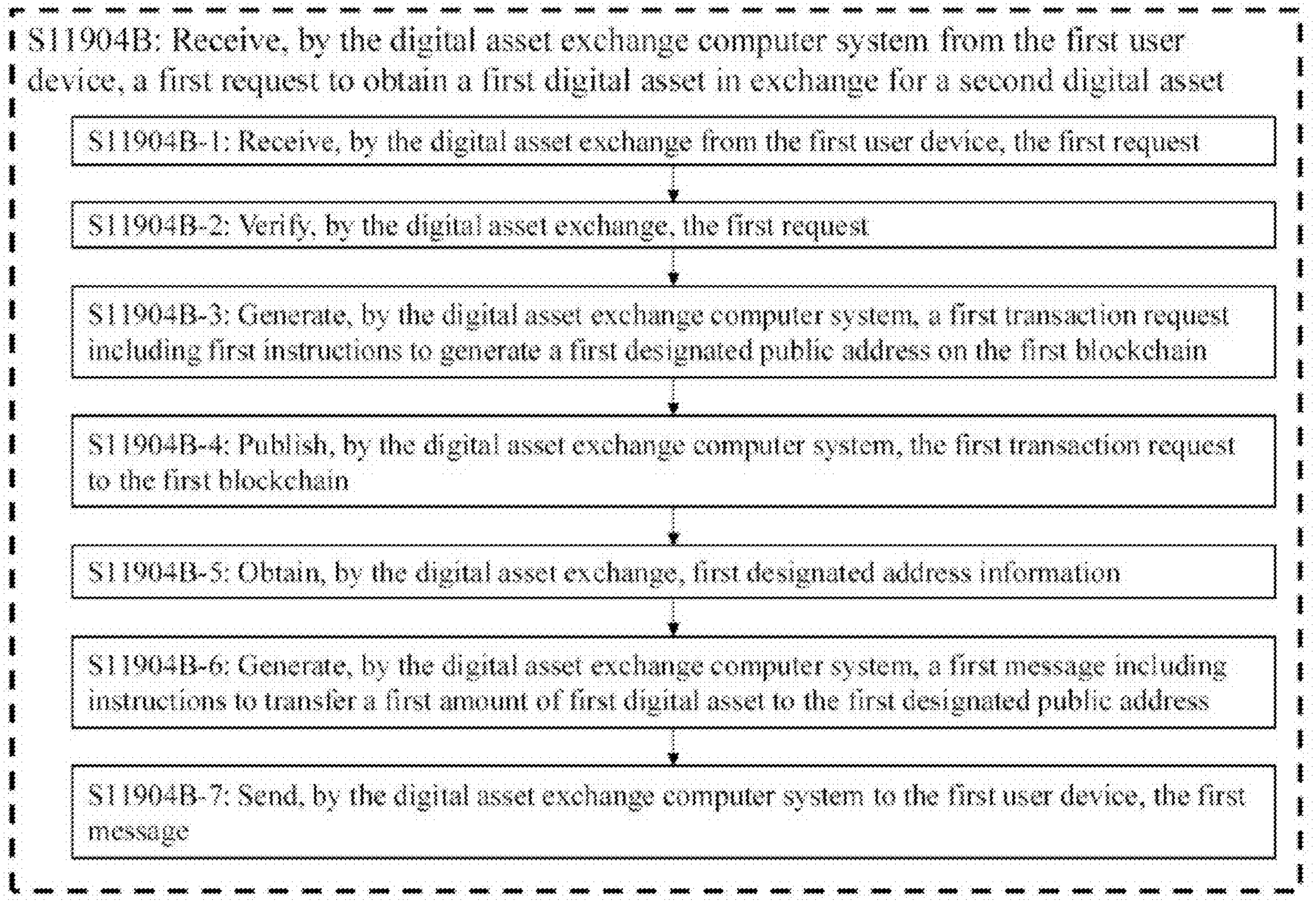
Figures 2, 119B:
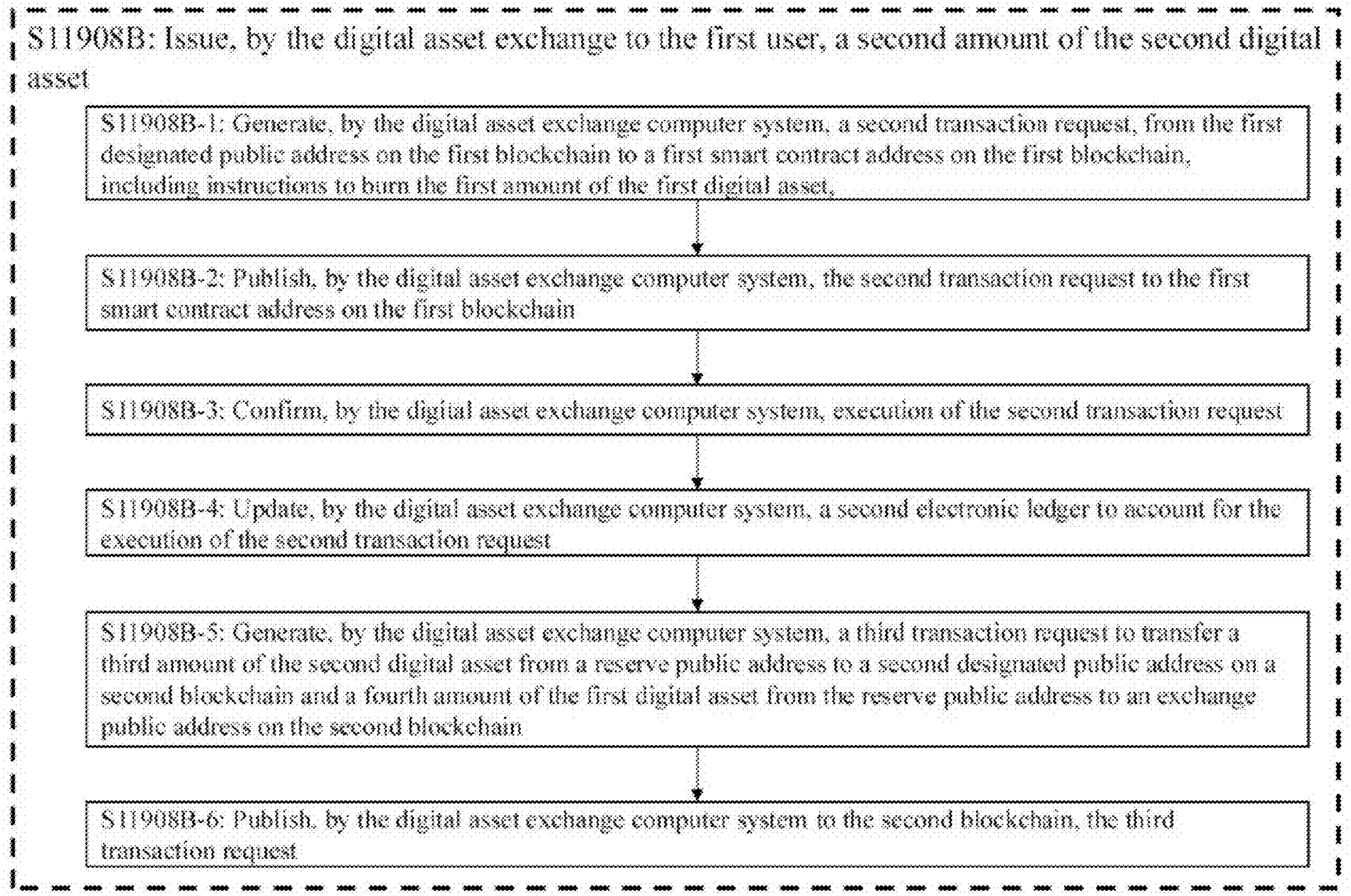
Figure 120:
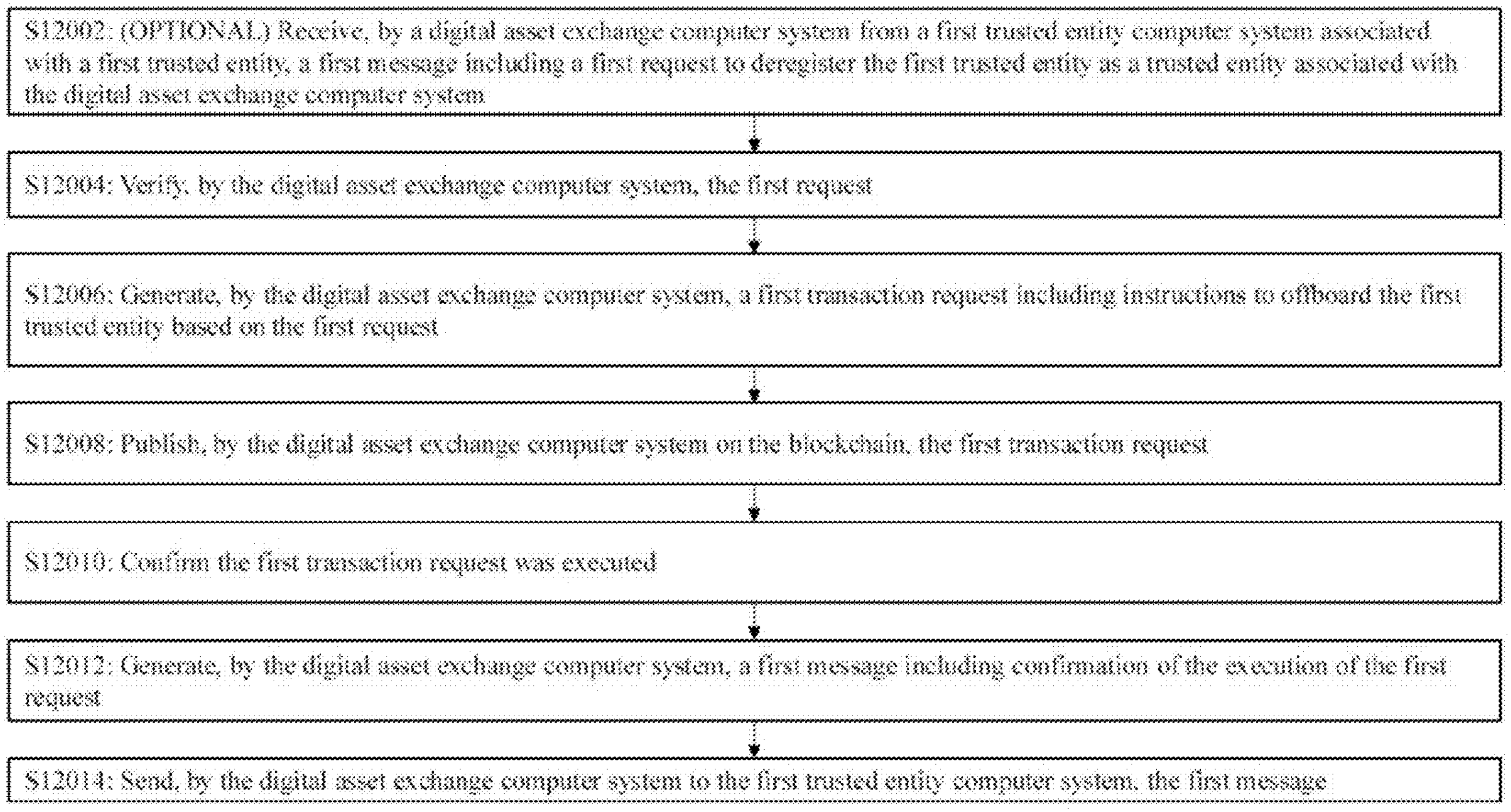

FIG. 103 is a schematic diagram of the participants in an ETP holding digital math-based assets in accordance with exemplary embodiments of the present invention;

FIGS. 104A and 104B are schematic diagrams of the accounts associated with a trust in accordance with exemplary embodiments of the present invention;

FIG. 105 is a block diagram of the data and modules in an exemplary embodiment of a trust computer system in accordance with the present invention;

FIGS. 106A and 106B are flow charts of processes for investing in the trust in accordance with exemplary embodiments of the present invention;

FIGS. 107A and 107B are flow charts of processes for redeeming shares in the trust in accordance with exemplary embodiments of the present invention;

FIG. 107C is a flow chart of an exemplary process for redemption of shares in an exchange traded product holding digital math-based assets in accordance with exemplary embodiments of the present invention;

FIGS. 108A and 108B are flow charts of additional processes associated with evaluation day for calculating NAV value of shares in a trust holding digital assets in accordance with embodiments of the present invention;

FIGS. 109A-B are exemplary flow charts illustrating an exemplary process for loaning digital assets on a digital asset computer system using a continuous book;

FIGS. 110A-C are exemplary flow charts illustrating an exemplary process for loaning digital assets on a digital asset computer system by conducting an electronic auction;

FIGS. 111A-C are exemplary flow charts illustrating an exemplary process for performing a return swap on a digital asset computer system in accordance with exemplary embodiments of the present invention;

FIGS. 112A-B are flow charts of a process and a corresponding exemplary schematic diagram for implementing a Swap Token for a swap trade between two users;

FIGS. 113A and 113B illustrate an exemplary dashboard of a user interface which allows registered users of a digital asset exchange to generate a smart contract on an underlying blockchain in accordance with exemplary embodiments of the present invention;

FIG. 114A is an exemplary dispute message for disputing benchmark information supplied by an oracle in accordance with exemplary embodiments of the present invention;

FIG. 114B-114C are exemplary digitally signed benchmark messages in accordance with exemplary embodiments of the present invention;

FIG. 115 is an exemplary flow chart of operational transaction processes of a digital math-based asset electronic exchange in accordance with exemplary embodiments of the present invention;

FIG. 116 is an exemplary asymmetrical puzzle sequence diagram in accordance with exemplary embodiments of the present invention;

FIG. 117A is a schematic diagram of participants in a system for wrapping and unwrapping a digital asset in accordance with exemplary embodiments of the present invention;

FIGS. 117B-1-117B-3 are schematic diagrams of participants in a system wrapping a digital asset in accordance with exemplary embodiments of the present invention;

FIGS. 117C-1-117C-3 are schematic diagrams of participants in a system burning a digital asset in accordance with exemplary embodiments of the present invention;

FIG. 118 is a flow chart of an exemplary process for on-boarding a user in connection with FIGS. 117A, 117B-1-117B-3, and 117C-1-117C-3 in accordance with exemplary embodiments of the present invention FIGS. 119A, 119A-1, and 119A-2 are flow charts of an exemplary process for wrapping a digital asset in accordance with exemplary embodiments of the present invention;

FIGS. 119B, 119B-1, 119B-2, and 119B-2 are flow charts of an exemplary process for burning a digital asset in accordance with exemplary embodiments of the present invention;

FIG. 120 is a flow chart of an exemplary process for off-boarding a user in connection with FIGS. 117A, 117B-1-117B-3, and 117C-1-117C-3 in accordance with exemplary embodiments of the present invention; and FIGS. 121A-121G are screenshots of exemplary graphical user interfaces in accordance with exemplary embodiments of the present invention.

DETAILED DESCRIPTION

The present invention generally relates to a system, method and program product for the generating and distribution of a stable value digital asset token tied to an underlying blockchain or other peer-to-peer network. The present invention also relates to cross-chain interaction with a stable value digital asset tied to an underlying blockchain or other peer-to-peer network.

Digital Math-Based Assets and Bitcoin

A digital math-based asset is a kind of digital asset based upon a computer generated mathematical and/or cryptographic protocol that may, among other things, be exchanged for value and/or be used to buy and sell goods or services. A digital math-based asset may be a non-tangible asset that is not based upon a governmental rule, law, regulation, and/or backing. The BITCOIN system represents one form of digital math-based asset. The ETHEREUM system represents another form of digital math-based asset, which allows for smart contracts, as discussed below. The LIBRA Blockchain system represents another form of digital math-based asset, which also allows for smart contracts.

A BITCOIN may be a unit of the BITCOIN digital math-based asset. An ETHER may be a unit of the ETHEREUM digital math-based asset. A LIBRA may be a unit of the LIBRA digital math-based asset.

Other examples of digital assets, including digital math-based assets, include BITCOIN, NAMECOINS, LITECOINS, PPCOINS, TONAL BITCOINS, BITCOIN CASH, ZCASH, IXCOINS, DEVCOINS, FREICOINS, IOCOINS, TERRACOINS, LIQUIDCOINS, BBQCOINS, BITBARS, PHENIXCOINS, RIPPLE, DOGECOINS, BARNBRIDGE, POLYGON, SOMNIUM SPACE, OCEAN PROTOCOL, SUSHISWAP, INJECTIVE, LIVEPEER, MASTERCOINS, BLACKCOINS, ETHER, NXT, BITSHARES-PTS, QUARK, PRIMECOIN, FEATHERCOIN, PEERCOIN, FACEBOOK GLOBAL COIN, STELLAR, TOP 100 TOKENS, TETHER; MAKER; CRYPTO.COM CHAIN; BASIC ATTENTION TOKEN; USD COIN; CHAINLINK; BITTORRENT; OMISEGO; HOLO; TRUEUSD; PUNDI X; ZILLIQA; ATOM, AUGUR, 0X, AURORA; PAXOS STANDARD TOKEN; HUOBI TOKEN; IOST; DENT; QUBITICA; ENJIN COIN; MAXIMINE COIN; THORECOIN; MAIDSAFECOIN; KUCOIN SHARES; CRYPTO-.COM; SOLVE; STATUS; MIXIN; WALTONCHAIN; GOLEM; INSIGHT CHAIN; DAI; VESTCHAIN; AELF; WAX; DIGIXDAO; LOOM NETWORK, NASH EXCHANGE; LATOKEN; HEDGETRADE; LOOPRING; REVAIN; DECENTRALAND; ORBS; NEXT; SANTIMENT NETWORK TOKEN, POPULOUS; NEXO; CELER NETWORK, POWER LEDGER; ODEM; KYBER NETWORK, QASH; BANCOR; CLIPPER COIN; MATIC NETWORK, POLYMATH; FUNFAIR; BREAD; IOTEX; ECOREAL ESTATE; REPO; UTRUST; ARCBLOCK; BUGGYRA COIN ZERO, LAMBDA; IEXEC RLC; STASIS EURS; ENIGMA; QUARKCHAIN; STORJ; UGAS; RIF TOKEN; JAPAN CONTENT TOKEN; FANTOM; EDUCARE; FUSION; GAS, MAINFRAME; BIBOX TOKEN, CRYPTO20; EGRETIA; REN; SYNTHETIX NETWORK TOKEN; VERITASEUM; CORTEX; CINDICATOR; CIVIC; RCHAIN; TENX; KIN; DAPS TOKEN; SINGULARITYNET; QUANT; GNOSIS; INO COIN; ICONOMI; MEDIBLOC [ERC20]; 0X; AION; ALGORAND; AMP; ARCA; ARWEAVE; AUDIUS; AVALANCHE; BCB; BCC; BITCOIN SV; BLOCKSTACKS; CBAT; CDAI; CELA; CELO; CETH; CHIA, CODA, COSMOS, CWBTC; CZRK; DECRED; DFINITY; EOS; ETH 2.0; FILECOIN; HEDGETRADE; ION; KADENA; KYBER NETWORK; MOBILECION; NEAR; NERVOS; OASIS; OMISEGO; PAXG; POLKADOT; SKALE; DIEM; SOLANA; STELLAR; TEZOS; THETA; XRP; DIEM and/or DEW, to name a few. In embodiments, the underlying digital asset may be a digital asset that is supported by its own digital asset network (like ETHER supported by the ETHEREUM Network, NEO supported by the NEO Network, to name a few). A digital asset token, in embodiments, may be a stable value token (such as GEMINI DOLLAR, PAXG, EFIL, EDOT, EXTZ, EATOM, to name a few), digital finance tokens that may be associated with decentralized lending (such as AMP, COMPOUND, PROTOCOL, KYBER, UMA, UNISWAP, YEARN, AAVE, to name a few), tokens, non-fungible token (such as CRYPTOKITTIES, Sorar, Decentraland, Goods Unchained, My Crypto Heroes, to name a few), and/or gaming tokens (such as SANDBOX), to name a few.

A non-fungible token is a token which can represent assets like art, collectibles, games, real estate, to name a few, and are considered unique, e.g., no two non-fungible tokens are identical. Non-fungible tokens can also be used in games, such as Sorare—With 100 soccer clubs officially licensed, Sorare lets you purchase NFTs that represent professional soccer players that can be used to play fantasy games against other collectors.

Decentraland—Decentraland is a virtual reality universe similar to The Sims or Second Life. Inhabitants of Decentraland buy, sell, and exchange ERC-721 tokens called LAND and use an ERC-20 token called MANA to purchase other in-universe items. Inside Decentraland, there are art shows, games, and specialized events users can participate in.

Gods Unchained—Gods Unchained is a turn-based collectible card game. NFT cards depict various characters, creatures, events, and powers, which can be used to play one-on-one against an opponent.

My Crypto Heroes—A multiplayer role-playing game, My Crypto Heroes issues NFTs of characters and other in-game items. Players level up their characters through battles and quests.

In embodiments, tokens may be based on standards such as ERC-720, ERC-721, ERC-1155, to name a few. In embodiments, digital assets, such as BITCOIN, ETHER, or LIBRA, (to name a few) may be accepted in trade by merchants, other businesses, and/or individuals in many parts of the world.

Digital assets may also include "tokens," which like other digital assets can represent anything from loyalty points to vouchers and IOUs to actual objects in the physical world. Tokens can also be tools, such as in-game items, for interacting with other smart contracts. A token is a "smart contract" running on top of a blockchain network (such as the ETHEREUM Blockchain, the BITCOIN Blockchain, the NEO Blockchain, the STELLAR Blockchain, the LIBRA Blockchain, to name a few). As such, it is a set of code with an associated database. In embodiments, the database may be maintained by an issuer. The code describes the behavior of the token, and the database may be a table with rows and columns or the like tracking who owns how many tokens. In embodiments, digital asset tokens, such as Gemini Dollars, or GAS to name a few, may be accepted in trade or commerce by merchants, other businesses, and/or individuals in many parts of the world.

Examples of blockchain networks include the BITCOIN network, the ETHEREUM Network, the NEO Network, HYPERLEDGER FABRIC Network, IBM Blockchain Network, MULTICHAIN Network, HYDRACHAIN Network, RIPPLE Network, R3 CORDA Network, BIGCHAIN DB Network, OPEN-CHAIN Network, IOTA Network, the LIBRA Network, AIBLOCKCHAIN Network, to name a few.

Examples of digital asset tokens include BITCOIN, NAMECOINS, LITECOINS, PPCOINS, TONAL BITCOINS, BITCOIN CASH, ZCASH, IXCOINS, DEVCOINS, FREICOINS, IOCOINS, TERRACOINS, LIQUIDCOINS, BBQCOINS, BITBARS, PHENIXCOINS, RIPPLE, DOGECOINS, BARNBRIDGE, POLYGON, SOMNIUM SPACE, OCEAN PROTOCOL, SUSHISWAP, INJECTIVE, LIVEPEER, MASTERCOINS, BLACKCOINS, ETHER, NXT, BITSHARES-PTS, QUARK, PRIMECOIN, FEATHERCOIN, PEERCOIN, FACEBOOK GLOBAL COIN, STELLAR, TOP 100 TOKENS, TETHER; MAKER, CRYPTO.COM CHAIN, BASIC ATTENTION TOKEN; USD COIN; CHAINLINK, BITTORRENT; OMISEGO; HOLO; TRUEUSD; PUNDI X; ZILLIQA; ATOM, AUGUR; 0X; AURORA; PAXOS STANDARD TOKEN; HUOBI TOKEN; IOST; DENT; QUBITICA; ENJIN COIN; MAXIMINE COIN; THORECOIN; MAIDSAFECOIN; KUCOIN SHARES; CRYPTO.COM, SOLVE, STATUS, MIXIN; WALTONCHAIN; GOLEM; INSIGHT CHAIN; DAI; VESTCHAIN; AELF; WAX; DIGIXDAO; LOOM NETWORK; NASH EXCHANGE; LATOKEN; HEDGETRADE; LOOPRING; REVAIN; DECENTRALAND; ORBS; NEXT; SANTIMENT NETWORK TOKEN; POPULOUS, NEXO; CELER NETWORK; POWER LEDGER; ODEM; KYBER NETWORK; QASH; BANCOR; CLIPPER COIN; MATIC NETWORK; POLYMATH; FUNFAIR; BREAD, IOTEX; ECOREAL ESTATE; REPO; UTRUST; ARCBLOCK; BUGGYRA COIN ZERO; LAMBDA; IEXEC RLC; STASIS EURS; ENIGMA, QUARKCHAIN; STORJ, UGAS; RIF TOKEN, JAPAN CONTENT TOKEN; FANTOM; EDUCARE; FUSION; GAS; MAINFRAME; BIBOX TOKEN; CRYPTO20; EGRETIA; REN; SYNTHETIX NETWORK TOKEN; VERITASEUM; CORTEX; CINDICATOR; CIVIC; RCHAIN; TENX; KIN; DAPS TOKEN; SINGULARITYNET; QUANT; GNOSIS; INO COIN; ICONOMI; MEDIBLOC [ERC20]; 0X; AION; ALGORAND; AMP; ARCA; ARWEAVE; AUDIUS; AVALANCHE; BCB; BCC; BITCOIN SV; BLOCKSTACKS; CBAT; CDAI; CELA; CELO; CETH; CHIA; CODA; COSMOS; CWBTC; CZRK; DECRED; DFINITY; EOS; ETH 2.0; FILECOIN; HEDGETRADE; ION; KADENA; KYBER NETWORK, MOBILECION; NEAR; NERVOS; OASIS; OMISEGO; PAXG; POLKADOT; SKALE; DIEM; SOLANA; STELLAR; TEZOS; THETA; XRP; DIEM and/or DEW, to name a few. In embodiments, the underlying digital asset may be a digital asset that is supported by its own digital asset network (like ETHER supported by the ETHEREUM Network, NEO supported by the NEO Network, to name a few). A digital asset token, in embodiments, may be a stable value token (such as GEMINI DOLLAR, PAXG, EFIL, EDOT, EXTZ, EATOM, to name a few), digital finance tokens that may be associated with decentralized lending (such as AMP, COMPOUND, PROTOCOL, KYBER, UMA, UNISWAP, YEARN, AAVE, to name a few), tokens, non-fungible token (such as CRYPTOKITTIES, Sorar, Decentraland, Goods Unchained, My Crypto Heroes, to name a few), and/or gaming tokens (such as SANDBOX), to name a few. In embodiments, tokens may be based on standards such as ERC-720, ERC-721, ERC-1155, to name a few.

In embodiments, a smart contract may be a computer protocol intended to digitally facilitate, verify, or enforce the negotiation or performance of credible transactions without third parties. In embodiments, smart contracts may also allow for the creation and/or destruction of tokens.

In embodiments, a digital math-based asset may be based on an open source mathematical and/or cryptographic protocol, which may exist on a digital asset network, such as a BITCOIN network, an ETHEREUM network, a NEO network, or a LIBRA network, to name a few. The network may be centralized (e.g., run by one or more central servers) or decentralized (e.g., run through a peer-to-peer network). The network may be an open network or a closed network. In embodiments, where the network is a closed network, the network may include administrative nodes (e.g., maintained by one or more validators) which may be access points for other systems to interact with the network. In embodiments, the network may be a semi-private and/or semi-public network. In embodiments, the network may be a closed network that transitions into an open network. Digital math-based assets may be maintained, tracked, and/or administered by the network.

A digital math-based asset system may use a decentralized electronic ledger system, which may be maintained by a plurality of physically remote computer systems. Such a ledger may be a public transaction ledger, which may track asset ownership and/or transactions in a digital math-based asset system. The ledger may be a decentralized public transaction ledger, which can be distributed to users in the network (e.g., via a peer-to-peer sharing). Ledger updates may be broadcast to the users and/or nodes across the network. Each user and/or node may maintain an electronic copy of all or part of the ledger, as described herein. In embodiments, a digital asset system may employ a ledger that tracks transactions (e.g., transfers of assets from one address to another) without necessarily identifying the assets themselves. In embodiments, the digital asset system may use other forms of peer-to-peer electronic ledger system.

In embodiments the ledger may include a plurality of states, where the state is updated, for example, when one or more transactions are executed and/or committed to the ledger. For example, in the ETHEREUM Network, a state may use a Merkel Tree data format. A ledger state, in embodiments, may be structured as a key-value store which maps public addresses to account values. In embodiments, when a new ledger state is generated, unchanged portions of the previous ledger state(s) may be reused. Each state of the ledger, in embodiments, may be maintained by one or more nodes, such as systems run by miners or trusted entities (e.g., a validator or an association of validators). Each node may maintain some or all the states of the ledger. In embodiments, each node maintains an electronic copy of the most recent ledger state to execute and/or commit a new transaction. In embodiments, other client devices (e.g., customer systems) may request, receive, and/or maintain a copy of the ledger from a node.

In embodiments, a digital asset ledger, such as the BITCOIN Blockchain or the ETHEREUM blockchain, a NEO blockchain, a LIBRA blockchain, to name a few, can be used to achieve consensus and to solve double-spending problems where users attempt to spend the same digital assets in more than one transaction. In embodiments, before a transaction may be cleared, the transaction participants may need to wait for some period of time, e.g., a set confirmation wait (typically one hour in the context of the BITCOIN network, 15 minutes in the context of the LITECOIN network, to name a few) before feeling confident that the transaction is valid (e.g., not a double count). Each update to the decentralized electronic ledger (e.g., each addition of a block to the BITCOIN Blockchain or the ETHEREUM blockchain) following execution of a transaction may provide a transaction confirmation. After a plurality of updates to the ledger (e.g., 6 updates) the transaction may be confirmed with certainty or high certainty.

In embodiments, a blockchain may include status information for each block within the blockchain. For example, the ETHEREUM blockchain has status information stored in a Merkel Tree data structure. A Merkel Tree may also be utilized as the decentralized or peer-to-peer electronic ledger, where each transaction or a majority of the transactions, associated with the decentralized or peer-to-peer electronic ledger is recorded, published, and/or stored. A Merkel Tree, in embodiments, may include a root hash of the ledger history structure (e.g., the authenticator to the complete state of the ledger that is signed by a quorum of trusted entities). As transactions are added to the ledger, the root hash of the ledger history structure grows. In embodiments, such as the LIBRA Network, as the ledger grows in size, one or more nodes may "prune" the Merkel Tree by eliminating old states that are not necessary for the processing of new transactions. In embodiments, the states that are "pruned" may store a representation (e.g., a hash) of the "pruned" states, allowing one or more nodes and/or users (e.g., clients) to access the old states if the ledger is queried. In the context of one or more the Merkel Tree embodiments, each transaction (or batch of transactions) that are executed and/or committed, may result in a new "leaf" being added to the Merkel Tree. Each new "leaf" of the Merkel Tree may also include data that is generated as a result of the execution of the new transaction(s). The aforementioned data, in embodiments, may be stored in its own "leaf" which may be separate from the "leaf" associated with the executed and/or committed transaction. For example, the data generated may enable a user to confirm that the transaction was executed.

In embodiments, a blockchain or peer-to-peer network can be a public transaction ledger of the digital math-based asset that is maintained by a distributed network, such as the BITCOIN network, the ETHEREUM network, the NEO network, or the LIBRA network to name a few or example, one or more computer systems (e.g., miners or nodes) or pools of computer systems (e.g., mining pools or node pools) can solve algorithmic equations allowing them to add records of recent transactions (e.g., blocks), to a chain of transactions. In embodiments, miners (or nodes) or pools of miners (or nodes pools) may perform such services in exchange for some consideration such as an upfront fee (e.g., a set amount of digital math-based assets) and/or a payment of transaction fees (e.g., a fixed amount or set percentage of the transaction) from users whose transactions are recorded in the block being added. In embodiments, digital assets in the form of a digital asset token, such as GAS, may be used to pay such fees.

In embodiments, such as when used in conjunction with the LIBRA Network (and the like), one or more computer systems and/or administrative nodes (e.g., validators or a trusted entity) or pools of computer systems and/or pools of administrative nodes (e.g., an association of validators or a group of trusted entities) can execute one or more transactions (e.g., blocks of transactions) causing records to be added to a transaction ledger (for example, adding another block to a blockchain, or leaf (or leaves) to a Merkel Tree). As previously mentioned, in embodiments, validators or associations of validators may perform such services in exchange for some consideration such as an upfront fee (e.g., a set amount of digital math-based assets), a payment of transaction fees (e.g., a fixed amount or set percentage of the transaction) from users whose transactions are recorded in the block being added, and/or from a return based off interest earned off of the fiat backing a fiat backed digital asset. In embodiments, digital assets in the form of a digital asset token, such as GAS, may be used to pay such fees.

The digital asset network (e.g., BITCOIN network, ETHEREUM network, NEO network, LIBRA network, to name a few) may timestamp transactions by including them in blocks that form an ongoing chain called a blockchain or other status updates like in the LIBRA network. In embodiments, the addition of a block (or status update) may occur periodically, e.g., approximately every 15 seconds, every minute, every 2.5 minutes, or every 10 minutes, to name a few. Such blocks (or status updates) cannot be changed without redoing the work that was required to create each block since the modified block. The longest blockchain may serve not only as proof of the sequence of events but also records that this sequence of events was verified by a majority of the digital asset network's computing power. In embodiments, the blockchain recognized by the nodes corresponding to the majority of computing power, or some other consensus mechanism, will become the accepted blockchain for the network. In embodiments, confirmation of a transaction may be attained with a high degree of accuracy following the addition of a fixed number of blocks to the blockchain (e.g., six blocks) after a transaction was performed and first recorded on the blockchain. As long as a majority of computing power (or other consensus mechanism) is controlled by nodes that are not cooperating to attack the network, they will generate the longest blockchain of records and outpace attackers.

There are a variety of consensus mechanisms (or protocols) that may be used to verify transactions recorded in a blockchain. A few non-limiting examples of these mechanisms are discussed below, however, other protocols may be used in accordance with exemplary embodiments of the present invention.

For example, the proof of control protocol is one example of a consensus mechanism and is used, for example, in the BITCOIN Blockchain. A more detailed discussion of proof of control protocols can be found in co-pending U.S. patent application Ser. No. 15/920,042 filed Mar. 13, 2018 entitled SYSTEMS, METHODS, AND PROGRAM PRODUCTS FOR VERIFYING DIGITAL ASSETS HELD IN A CUSTODIAL DIGITAL ASSET WALLET, the entire content of which is hereby incorporated by reference herein.

The proof of stake protocol is another optional protocol that may be implemented by blockchains. In this type of protocol, the validator's stake is represented by the amount of digital assets held. Validators accept, reject or otherwise validate a block to be added to the blockchain based on the amount of digital assets held by the Validator on the blockchain. If the Validators are successful in validating and adding the block, such a protocol, in embodiments, will award successful Validators a fee in proportion to their stake.

The delegated proof of stake protocol is another protocol that is available and is, for example, used by the EOS blockchain. In this protocol, blocks are produced in a fixed number in rounds (e.g., 21 for EOS). At the start of every such round, block producers are chosen. A number less than all of the producers (e.g., 20 in EOS) are automatically chosen while a corresponding number are chosen proportional to the number of their votes relative to other producers. In embodiments, the remaining producers may be shuffled using a pseudorandom number derived from the block time, for example. In embodiments, other forms of randomized selection may be used. To ensure that regular block production is maintained, in embodiments, block time is kept short (e.g., 3 seconds for EOS) and producers may be punished for not participating by being removed from consideration. In embodiments, a producer may have to produce a minimal number of blocks, e.g., at least one block every 24 hours to be in consideration. In embodiments, all the nodes will, by default, not switch to a fork which does not include any blocks not finalized by a sufficient majority (e.g., 15 of the 21 producers) regardless of chain length Thus, in EOS, each block must gain 15 of 21 votes for approval to be considered a part of the chain.

In embodiments, a delegated byzantine fault tolerance protocol (or Byzantine Fault model) ("BFT") may be used as a consensus mechanism. In embodiments, the BFT may allow one or more trusted entities (or validators) to arbitrarily deviate from the protocol In embodiments, deviating from the protocol may be limited by computational boundaries (e.g., cryptographic assumptions). The BFT, in embodiments, may enable a system to continue to function, even if one or more entities of a set of trusted entities are no longer trusted. An entity may not be a trusted entity if the entity, for example, is colluding and/or behaving maliciously to try to sabotage the system. An example of a BFT protocol is used in connection with NEO. For example, NEO uses this type of protocol. In this protocol, one of the bookkeeping nodes is randomly chosen as a "speaker." The speaker then looks at all the demands of the "citizens," (e.g., all of the holders of the digital asset), and creates a "law" (e.g., a rule governing the protocol). The speaker then calculates a "happiness factor" of these laws to see if the number is enough to satisfy the citizen's needs or not. The speaker then passes the happiness factor down to the delegates (e.g., the other bookkeeping nodes). The delegates may then individually check the speaker's calculations. If the speaker's number matches the delegate's number, then the delegates give their approval, and if not, then they give their disapproval. In embodiments, a sufficient majority (e.g., 66% in NEO) of the delegates need to give their approval for the law to pass, i.e., for the block to be added. If a sufficient majority is not obtained (e.g., less than 66% approval), a new speaker is chosen, and the process starts again. As another example, a BFT (e.g., the LIBRA BFT) may require 3*X+1 votes to be cast and distributed among a set of trusted entities. X, in this example, may refer to an integer pre-selected that is determined to have a correct balance of honesty, safety, and/or efficiency. In embodiments, X may refer to a variable that fluctuates Continuing the example, if the number of votes equals and/or drops below X, the trusted entities may fork.

In embodiments, a consensus protocol (e.g., BFT) may allow a set of nodes to create a logical appearance of a single database. The consensus protocol, in embodiments, may replicate submitted transactions among a set of trusted entities, provide a mechanism for executing transactions against a ledger (e.g., database), and then provide a mechanism for a set of trusted entities to agree on one or more transactions to execute. A consensus protocol, in embodiments, may also mitigate one or more hardware and/or software failures. In embodiments, a consensus protocol may maintain the integrity of a system if trusted entities crash and/or restart, even if all of a set of trust entities restart at the same time. In embodiments, a consensus protocol may be implemented by one or more entities (e.g., a trusted entity or pool of trusted entities). In the case where only one entity is implementing a consensus protocol (e.g., god mode), a quorum may be one vote (e.g., to execute one or more transactions). In the case where more than one entity is implementing a consensus protocol, a quorum may be a majority (or another percentage of the total number of entities) of the more than one entity.

RIPPLE uses an algorithm in which each server gathers all valid transactions that have not yet been applied and makes them public. Each server then amalgamates these transactions and votes on the veracity of each. Transactions that receive at least a minimum number of yes votes will move into another round of voting. A minimum of 80% approval is required before a transaction is applied.

In embodiments, other consensus mechanisms may be used such a proof of capacity, proof of elapsed time, to name a few.

Proof of capacity is a consensus mechanism that uses a process called plotting. Proof of capacity uses pre-stored solutions in digital storage (such as non-volatile memory like hard disks). After a storage has been "plotted" (e.g., been filled with solutions), it can be part of the block creation process. The node that has the fastest solution to the puzzle of a (new) block, gets to create the new block. The more storage capacity the node has, the more solution it can store, the higher the odds of creating a new block.

Proof of elapsed time is a consensus mechanism that aims to decide randomly and fairly who gets to produce a block based on the time that a note has waited. To decide who gets to produce a block, the process assigns a random wait time to each node. The node whose wait time finishes first gets to produce the next block. In embodiments, proof of elapsed time consensus mechanism works best if there is a system in place that nobody can run multiple nodes and that assigned waiting is actually random.

These and other protocols may be used to generate a blockchain in accordance with exemplary embodiments of the present invention.

In embodiments, transaction messages can be broadcast on a best effort basis, and nodes can leave and rejoin the network at will. Upon reconnection, a node can download and verify new blocks (or other forms of status updates) from other nodes to complete its local copy of the blockchain.

In the exemplary BITCOIN system, a BITCOIN is defined by a chain of digitally signed transactions that began with its creation as a block reward through BITCOIN mining. Each owner transfers BITCOIN to the next owner by digitally signing them over to the next owner in a BITCOIN transaction which is published to and added on to a block on the blockchain. A payee can then verify each previous transaction, e.g., by analyzing the blockchain to verify the chain of ownership.

Other examples of different types of blockchains noted above that are consistent with embodiments of present invention pose unique problems. Certain currencies present unique challenges in that transactions and/or wallets or digital asset addresses associated therewith may be shielded (e.g., not viewable by the public on the ledger). For example, MONERO is based on the CRYPTONIGHT proof-of-work hash algorithm and possesses significant algorithmic differences relating to blockchain obfuscation. MONERO provides a high level of privacy and is fungible such that every unit of the currency can be substituted by another unit. MONERO is therefore different from public-ledger cryptocurrencies such as BITCOIN, where addresses with coins previously associated with undesired activity can be blacklisted and have their coins refused by others.

In embodiments, "proof of brain" may be a type of token reward algorithm used in social media blockchain systems that encourages people to create and curate content. In embodiments, proof of brain may enable token distribution by upvote and like-based algorithms, which may be integrated with websites to align incentives between application owners and community members to spur growth.

In particular, in MONERO, ring signatures mix the spender's address with a group of others, making it more difficult to establish a link between each subsequent transaction. In addition, MONERO provides "stealth addresses" generated for each transaction which make it difficult, if not impossible, to discover the actual destination address of a transaction by anyone else other than the sender and the receiver. Further, the "ring confidential transactions" protocol may hide the transferred amount as well. MONERO is designed to be resistant to application-specific integrated circuit mining, which is commonly used to mine other cryptocurrencies such as BITCOIN. However, it can be mined somewhat efficiently on consumer grade hardware such as x86, x86-64, ARM and GPUs, to name a few.

Another example of a modified blockchain consistent with exemplary embodiments of the present invention discussed above is DARKCOIN. DARKCOIN adds an extra layer of privacy by automatically combining any transaction its users make with those of two other users—a feature it calls DARKSEND—so that it will be more difficult to analyze the blockchain to determine where a particular user's money ended up.

Yet another example of a modified blockchain consistent with exemplary embodiments of the present invention discussed above is ZCASH. The ZCASH network supports different types of transactions including: "transparent" transactions and "shielded" transactions. Transparent transactions use a transparent address (e.g., "t-address"). In embodiments, transactions between two t-addresses behave like BITCOIN transactions and the balance and amounts transferred are publicly visible on the ZCASH blockchain. Unlike the BITCOIN Blockchain, the ZCASH network may also support shielded transactions using a shield address (e.g., "z-address"). In embodiments, the "z-address" provides privacy via zero-knowledge succinct noninteractive arguments of knowledge (e.g., "zk-SNARKS" or "zero-knowledge proofs"). The balance of a z-address is not publicly visible on the ZCASH blockchain—the amount transferred into and out of a z-address is private if between two z-addresses—but may be public if between a z-address and a t-address.

In embodiments, a digital asset based on a blockchain, may, in turn, include special programming, often referred to as "smart contracts", which allow for the creation of "tokens", which in turn are digital assets based on digital assets. In embodiments, tokens may be ERC-20 tokens, and used in conjunction with ERC-20 token standard as a programming language. In embodiments, other protocols may be used including but not limited to ERC-223 and ERC-721, to name a few. In embodiments, the programming language may be the MOVE programming language. In embodiments, the blockchain may be a permission blockchain. In embodiments, the blockchain may be a permissionless blockchain. In embodiments, smart contracts may be written on other smart contracts to provide for increased functionality. One non-limiting example of this type of structure is the open source CRYPTOKITTIES game in which digital kittens are provided as ERC-721 tokens with a series of smart contracts provided to define how the kittens will interact with each other and with users. CRYPTOKITTY is a non-fungible token. A non-fungible token may be stored on a peer-to-peer distributed network in the form of a blockchain network (or other distributed networks, e.g., a peer-to-peer network). Examples of non-fungible tokens include one or more of the following: CRYPTOKITTIES, CRYPTOFIGHTERS, DECENTRALAND, ETHERBOTS, ETHERMON, RARE PEPPES, SPELLS OF GENESIS, CRAFTY, SUPERARRE, TERRA0, and UNICO, to name a few. In embodiments, non-fungible tokens, (e.g., 5 CRYPTOKITTIES) may be transferable and accounted for as a digital asset token on an underlying blockchain network (e.g., ETHEREUM Network). In embodiments, a first non-fungible token (e.g., a First CryptoKitty) may have attributes (e.g., characteristics of a non-fungible token) that are different from a second non-fungible token (e.g., a Second CryptoKitty), even if both are the same type of non-fungible token (e.g., a CryptoKitty). For example, the First CryptoKitty may be a striped CRYPTOKITTY, while the Second CryptoKitty may be a droopy-eyed CRYPTOKITTY. In embodiments, the attributes of each non-fungible tokens may be customizable. In embodiments, programming modules may be added to and/or transferred with programming modules associated with specific tokens. By way of illustration, a first token, e.g., a CRYPTOKITTY Tiger, may purchase a second token, e.g., a digital "hat," that will then become associated with the first token to be a Tiger with a hat, and remain with the first token when transferred. Thus, by way of illustration, in the context of example embodiments of the present invention, the first token could be, e.g., a security token, and the second token could be, e.g., an account holding SVCoins, or a right to request SVCoins from another account as discussed below. If the first token is transferred, the second token would transfer with the ownership of the first token. A more detailed description of the process of purchasing and/or obtaining a non-fungible token is located below in connection with FIGS. 50A-52D, the description of which applying herein.

In embodiments, digital assets can include tokens, which like other digital assets that can represent anything from loyalty points to vouchers and IOUs to actual objects in the physical world. Tokens can also be tools, such as in-game items, for interacting with other smart contracts. A token is a smart contract running on top of a blockchain network or peer-to-peer network (such as the ETHEREUM Blockchain, the BITCOIN Blockchain, the NEO Blockchain, the LIBRA Blockchain, to name a few). As such, it is a set of code with an associated database. In embodiments, the database may be maintained by an issuer. In embodiments, the database may be included as part of the blockchain. In embodiments, the ledger may be maintained in the first instance as a database in a sidechain by the issuer or agent of the issuer and subsequently published and stored as part of a blockchain. The code describes the behavior of the token, and the database may be a table with rows and columns tracking who owns how many tokens.

If a user or another smart contract within the blockchain network (such as the ETHEREUM Network) sends a message to that token's contract in the form of a "transaction," the code updates its database.

Figure 10:
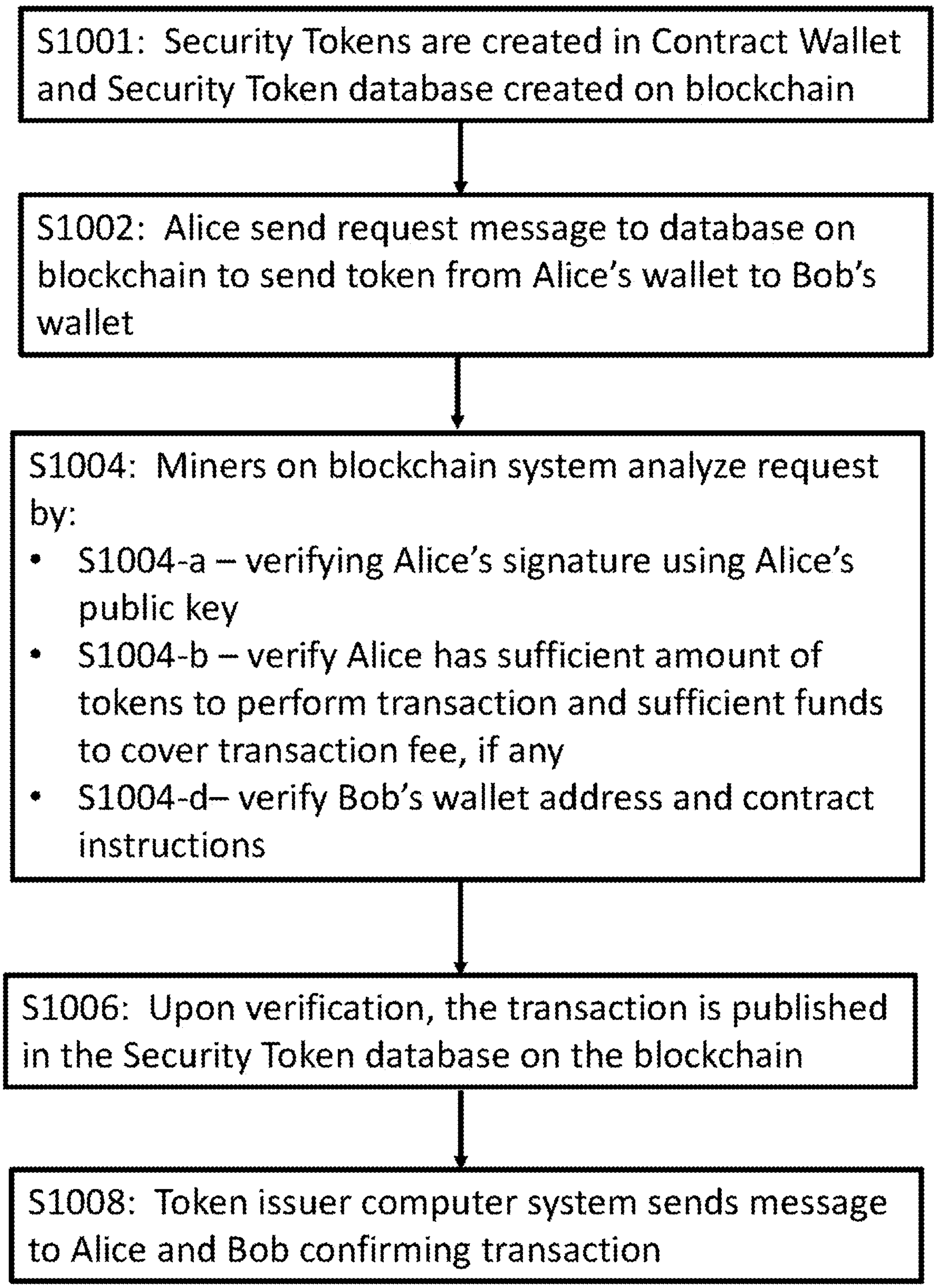
FIG. 10 is an exemplary flow chart of the process of sending tokens from Alice to Bob on the ETHEREUM blockchain in accordance with exemplary embodiments of the present invention.

So, for instance, as illustrated in FIG. 10, using a token based on the ETHEREUM Network for illustration purposes, when a wallet app sends a message to a token's contract address to transfer funds from Alice to Bob, the following process occurs.

In embodiments, an underlying blockchain, like the BITCOIN Blockchain, may have limited or no smart contract capabilities.

In such embodiments, an overlying protocol, such as Omni Layer (https://www.omnilayer.org/) may also be used to create custom digital assets on such an underlying blockchain, like the BITCOIN Blockchain, as described in https://github.com/OmniLayer/spec. In embodiments, a smart contract may be used for transactions involving BITCOIN through the use of a two-way peg with side chain. The side chain can share miners with the BITCOIN Blockchain and allows smart contracts to be run, such as contracts using the ETHEREUM virtual machine. When BITCOIN is to be used in the smart contract side chain, the BITCOIN is locked and an equal amount of side chain currency, an example of which is SUPER BITCOIN (SBTC), is assigned to the corresponding address. After the smart contract transaction is completed, the side chain currency is locked and the BITCOIN is unlocked. An example of such a side chain is ROOTSTOCK.

In embodiments, where the blockchain is the BITCOIN Blockchain, and another protocol is used as a layer over the BITCOIN Blockchain to provide for smart contract functionality. For example, the other protocol may be a two-way peg of stable value digital asset tokens to BITCOIN and a sidechain that shares miners with the BITCOIN Blockchain. In embodiments, the other protocol is an omni layer protocol.

For illustration purposes, FIG. 10 shall be described with respect to a token on a blockchain with ERC20 smart contract capabilities, such as the ETHEREUM Blockchain and the NEO Blockchain, to name a few.

In step S1001, at the token issuer computer system, a token, such as a Stable Value Token by way of illustration, is created. In embodiments, the token can be other forms of tokens, such as a Security Token, or other form of tokens. In embodiments, each token may have a "ERC20 Contract Wallet Address" ("Contract Address") which is an address on the blockchain at which the code for the smart contract is stored. In embodiments, the smart contract may include instructions to perform at least: (1) token creation, (2) token transfer, (3) token destruction; and (4) updating smart contract coding, to name a few. In addition, the smart contract may include additional instructions related to authority to conduct operations and/or transactions associated with the smart contract or token.

In embodiments, of the present invention, the minimal specification for a Token, such as a Stable Value Token, may include instructions to perform at least: (1) a "totalSupply" function, which when called, will respond with a count of the number of tokens in existence; (2) a "balanceOf" function, which when called with a specific account (address) as a parameter, responds with the count of the number of tokens owned by that account; and (3) a "transfer" function, which is an example of a state modifying function, that, when called, given one or more target accounts and corresponding transferred amounts as parameters, the transfer function will decrease the balance of the caller account by the corresponding transfer amounts, and increase the target accounts by the target amounts (or fail if the caller account has insufficient amounts or if there are other errors in the parameters).

In embodiments, a Stable Value Token may be created with a fixed supply of tokens at the time of its creation. For example, a Stable Value Token may be created with a supply of 21 million tokens and set Address 1 (mathematically associated with a private key 1) as the owner of all 21 million tokens. Thereafter, private key 1 will be required to generate a call to the transfer function in order to assign some portion of the 21 million tokens with a second address 2 (mathematically associated with a private key 2) or any other address (also mathematically associated with a corresponding private key).

In embodiments, a Stable Value Token may be created with a variable supply of tokens which can be set to increase or decrease after original creation. In such embodiments, the minimum functions required will also include: (4) a "print" function, which is another example of a state modifying function, that when called allows for the creation of additional Stable Value Tokens into the total Supply of Stable Value Tokens; and (5) a "burn" function, which is also another example of a state modifying function, that when called allows for the destruction of previously created Stable Value Token from the total Supply of the Stable Value Tokens. As discussed below in greater detail, in embodiments, the print and burn function may include limits on the Addresses that are allowed to call those functions.

Currently, due to the immutable nature of the ETHEREUM blockchain, once a smart contract is written to a specific Contract Address it cannot be changed. However, in embodiments, the various functions called for in the Contract Address may be associated with specific authorized key pairs of public keys (or "addresses") and corresponding private keys (which are mathematically associated with public keys). In embodiments, one or more private keys may be stored off-line in, what is sometimes referred to as, a designated cold storage wallet associated with the token issuer. In such embodiments, keys may be generated, stored, and managed on board hardware security modules (HSMs). For example, HSMs, e.g., each a "signer," should have achieved a rating of FIPS PUB 140-2 Level 3 (or higher). In embodiments, one or more private keys may be stored on-line in, what is sometimes referred to as a designated hot storage wallet associated with the token issuer. In embodiments, the Contract Address may include instructions which are associated with authorizing one or more designated key pairs stored off-line in, e g., one or more cold storage wallets on one or more air-gapped computer systems associated with the token issuer, but may also give at least some permission to perform operations by one or more designated key pairs stored on-line, in, e.g., one or more hot wallets associated with the token issuer and/or a token administrator on behalf of the token issuer on one or more computer systems connected to the digital asset computer system. In embodiments, the on-line computer systems would be co-located with the digital asset computer systems. In embodiments, the Stable Value Tokens may be created in batches (for example, 100,000 SVCoins worth $100,000 U.S. dollars) by a designated key pair (such as an off-line designated key pair) authorized by smart contract and assigned by such a key pair to a designated address associated with on on-line public key for transactions as necessary.

In embodiments, a Stable Value Token database is maintained in a blockchain, such as the ETHEREUM blockchain, for example. In embodiments, the ledger may be maintained, in the first instance, as a database in a sidechain by the issuer or agent and subsequently published and stored as part of a blockchain.

In embodiments, a Stable Value Token database is maintained in a blockchain, such as the ETHEREUM blockchain, for example. In embodiments, the ledger may be maintained in the first instance as a database in a sidechain by the issuer or agent and subsequently published and stored as part of a blockchain.

In embodiments, Stable Value Tokens may be generated on the fly, however, in this case, the contract code, which is the executable code that is stored at the Contract Address location on the blockchain, may designate one or more public addresses corresponding to one or more on-line private keys held in, e.g., a hot wallet(s), or one or more public addresses corresponding on one or more off-line public keys held in, e.g., a cold wallet(s), or some combination thereof, as the authorized caller of some functionality. A more detailed discussion of exemplary structures for hot wallets and cold wallets is presented in U.S. Pat. No. 9,892,460 issued Feb. 13, 2018 entitled SYSTEMS, METHODS, AND PROGRAM PRODUCTS FOR OPERATING EXCHANGE TRADED PRODUCTS HOLDING DIGITAL MATH-BASED ASSETS, the entire content of which is incorporated by herein by reference. In embodiments, Contract Wallets may be maintained by the token issuer and which would hold the private key associated with the token on an associated device. In embodiments, Contract Wallets may be provided on a user computer device and hold the private key associated with the token. In such embodiments, a user computer device may include a software application to provide secure access to the token issuer such that the user can engage in transactions.

In embodiments, a subset of two or more corresponding key pairs from a larger collection of key pairs may be required to engage in certain transaction. For example, 2 of 3, 2 of 5, or 3 of 5, keys may be required to engage in certain transactions. Certain transactions requiring more than one signature may be controlled by instructions of a smart contract (e.g., one or more scripting limitations). The one or more scripting limitations, in embodiments, may specify instances that require multiple signatures to authorize a transaction. In embodiments, the one or more scripting limitations may specify instances that do not require multiple signatures to authorize a transaction. In embodiments, transactions requiring more than one signature may be a pay-to-script-hash (P2SH) account. In embodiments, such transactions may include sensitive or relatively high risk transactions.

In embodiments, such as in the LIBRA Network, a public key may be associated with two or more private keys. The two or more private keys, in embodiments, may be variants of the same private key. For example, a first public key may be associated with a first private key. The first private key may be "rotated" such that a second private key is generated. The first private key may be "rotated" by applying one or more hash algorithms to the first private key. The rotation of the private key, in embodiments, may serve a security purpose, allowing a user to change its private key to prevent a security incident and/or in response to a security incident.

In embodiments, the smart contract(s) and associated authorized private keys may be maintained by the SVCoin issuer and which would hold the authorized private key(s) associated with the token on an associated device.

By way of illustration, an ERC-20 Contract can include the following representative type of functions as shown in Table 1 in its programming of a Smart Contract associated with a particular token, such as a security token or a stable value token:

TABLE 1

```
//----------------------------------------------------------------------------
// ERC Token Standard #20 Interface
// https://github.com/ETHEREUM/EIPs/blob/master/EIPS/eip-20-token-standard.md
//----------------------------------------------------------------------------
contract ERC20Interface {
    function totalSupply( ) public constant returns (uint);
    function balanceOf(address tokenOwner) public constant returns (uint balance);
    function allowance(address tokenOwner, address spender) public constant returns (uint
remaining);
    function transfer(address to, uint tokens) public returns (bool success);
    function approve(address spender, uint tokens) public returns (bool success);
    function transferFrom(address from, address to, uint tokens) public returns (bool success);

    event Transfer(address indexed from, address indexed to, uint tokens);
    event Approval(address indexed tokenOwner, address indexed spender, uint tokens);
```

Some of the tokens may include further information describing the token contract such as shown Table 2:

TABLE 2

| | |
|---|---|
| 1 | string public constant name = "Token Name"; |
| 2 | string public constant symbol = "SYM"; |
| 3 | uint8 public constant decimals = 18; // 18 is the most common number of decimal places |

In embodiments, a more elaborate smart contract can be set up to allow token issuers to have hybrid control over which key pairs have authority to affect the token supply and distribution. In embodiments, a hybrid combination of on-line and off-line key pairs can be used to control the supply and distribution of tokens.

For example, in embodiments, a smart contract may include a state-changing function such as limitedPrint, where the authorized caller of such function would be authorized only to print (or issue) a specific limited amount of tokens. In embodiments, the limitedPrint function may authorize printing or issuing of tokens for a set period of time. In embodiments, the limitedPrint function may authorize printing or issuing of only a certain number of tokens over a set period of time. In embodiments, the limitedPrint function may be used with an on-line key pair (e.g., hot wallet), to allow for fast and efficient token creation, but limit risk of unauthorized takeover of the on-line key pair to the set limit.

In conjunction with a limitedPrint command, a separate state-changing function of raiseCeiling can be used to increase the authority for the on-line key pair using a different key pair, such as an off-line key pair (e.g., cold wallet), which is considered to be more secure.

In embodiments, using a limitedPrint function with a set limit that can be implemented by one or more designated on-line key pairs (e.g., hot wallets), and a raiseCeiling function which may change that limit under the authority of a different set of one or more designated off-line key pairs (e.g., cold wallets), the automated increases in the token supply through on-line control will only continue up until the ceiling is reached, at which point further intervention through off-line control is required. In embodiments, a subset of two or more corresponding key pairs from a larger collection of key pairs may be required to engage in certain transaction. For example, 2 of 3, 2 of 5, or 3 of 5, to name a few, keys may be required to engage in certain transactions. In embodiments, as noted above, such transactions may include sensitive or relatively high-risk transactions.

One should consider the difference between the current token supply and the supply ceiling as part of the tokens at risk. If the current token supply has decreased through the use of burn, then the effective funds at risk could have increased without a corresponding decrease in the supply ceiling. The ceiling can be lowered by on-line control, through a function called lowerCeiling. This allows for relinquishing some portion of what has been granted through off-line control to limit the effective funds at risk through compromise of on-line key management systems. In embodiments, a limit on number of tokens that can be burned may also be included.

Figure 13A:
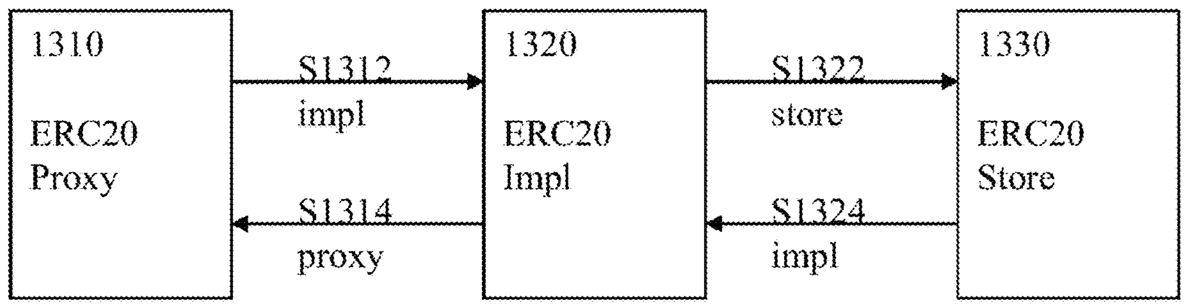
FIGS. 13A-13H illustrate exemplary embodiments of a token that utilizes smart contracts in accordance with exemplary embodiments of the present invention.

In embodiments, as illustrated in FIG. 13A, the token may be set up using at least three core smart contracts, e.g., ERC20Proxy 1310, ERC20Impl 1320, and ERC20Store 1330 that cooperatively implement an ERC20 compliant token.

In the context of a ERC20 compliant token on the ETHEREUM blockchain, there is one, and will only ever be one instance of ERC20Proxy 1310. This is the smart contract that users of the token treat as the token contract. Thus, ERC20Proxy 1310 can be considered the permanent face of interacting with the token on the ETHEREUM blockchain.

However, in embodiments, ERC20Proxy 1310 may have almost no code and does not keep any state information itself. Instead, in embodiments, ERC20Proxy 1310 has one or more implementations (e.g., ERC20 Impl 1320, ERC20 Impl (1) 1340, ERC20 Impl (2), to name a few) that executes the logic of the token. S1312 "impl" represents a delegation from ERC20 Proxy 1310 to ERC20Impl 1320. Thus, the instance of ERC20Impl 1320 executes the specific delegated functions. ERC20Impl 1320 may further limit the authority to implement to the specific delegated functions to only specified trusted callers (e.g., as shown in FIGS. 13C, 13G and 13H, one or more off-line key set 1362, one or more on-line key set 1364, to name a few). S1314 proxy illustrates the authorization of ERC20Impl 1320 executing logic on behalf of ERC20Proxy 1310, through call functions from one or more authorized addresses.

In embodiments, state information, such as token balances, may be maintained in a separate instance, e.g., ERC20Store 1330, a "backing store." In such embodiments, ERC20Store 1330 would own the delegated state of the token. S1322 "store" illustrates the delegation of state information from ERC20Impl 1320 to ERC20Store 1330. In embodiments, the instance of ERC20Store 1330 may execute updates to the state of the token, such as updates to token balances that occur during a token transfer to one or more designated key sets. S1324 "impl" represents the address that the ERC20Store 1330 will permit to invoke the update functions. In embodiments, that address is the "Contract Address" of the active version of ERC20Impl 1320.

This separation of duties-public face, logic, and storage, for ERC20Proxy 1310, ERC20Impl 1320, and ERC20Store 1330, respectively-provides the ability for token issuer to replace the logic of the system at a later date. In embodiments, the logic may be replaced by changing the impl arrows (e.g., S1312 "impl" and S1324 "impl").

Figure 13B:
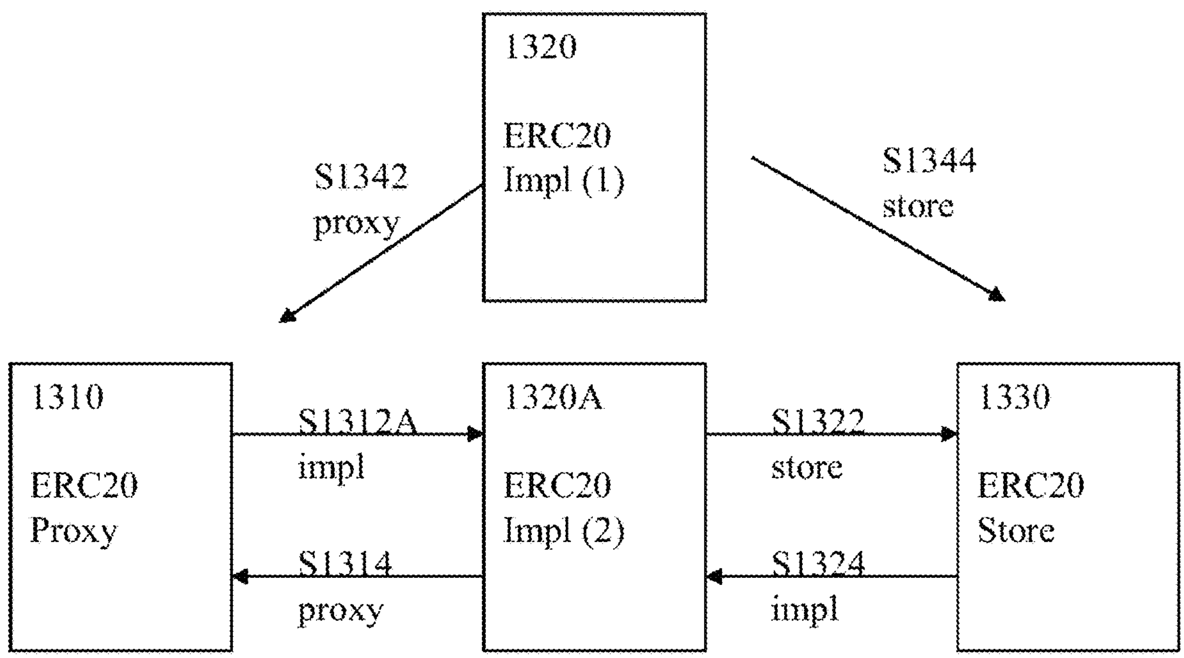
Figure 13C:
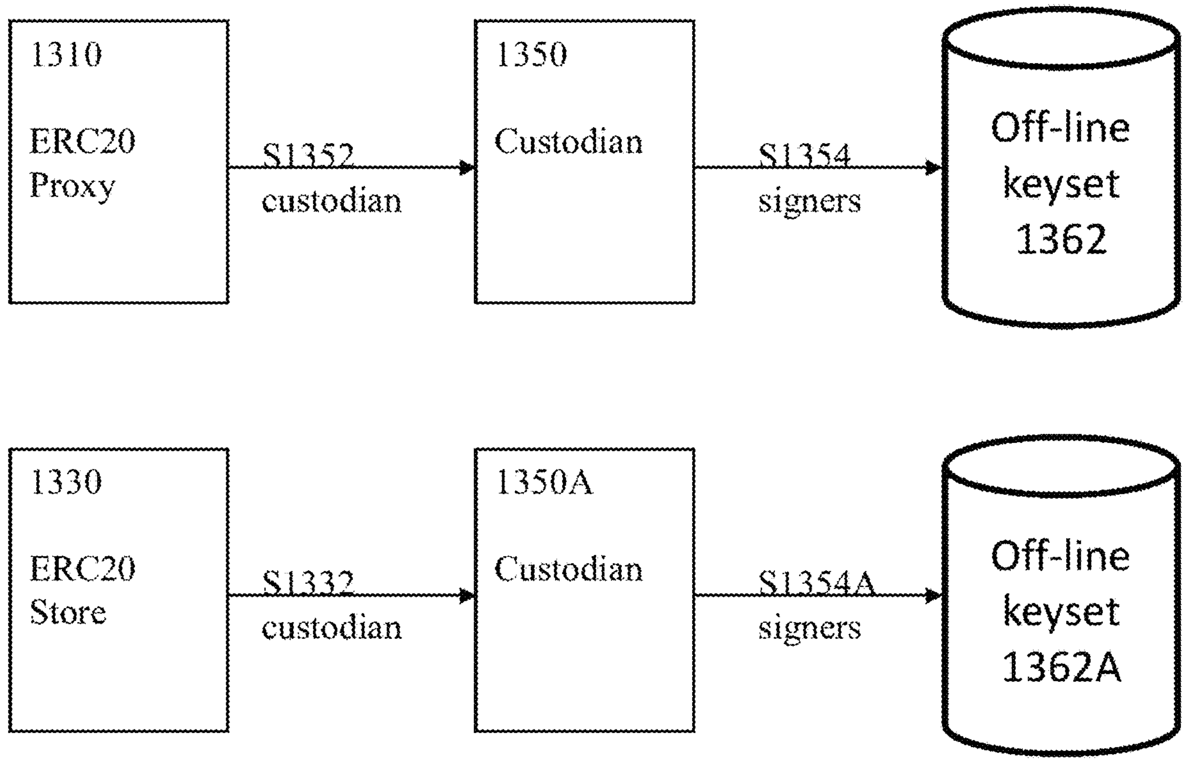

FIG. 13B illustrates an embodiment where a token has been upgraded, by creating a new instance of ERC20Impl (ERC20Impl (2) 1320A) with a second version of the code previously implemented through ERC20Impl 1320. The instance of ERC20Proxy 1310 now delegates its implementation in S1312A "impl" to ERC20Impl (2) 1320A (version 2 of the code) instead of the previous ERC20Impl 1320 (version 1), and the instance of ERC20Store 1330 will now only accept calls from ERC20Impl 1320A (version 2). The original ERC20Impl 1320 (version 1) remains but has become inert as it is unlinked from the system.

Turning to FIGS. 13C-13F, custodianship will be discussed.

In embodiments, a fourth type of contract, Custodian 1350, may also be implemented. A Custodian 1350 is logic which designates which key pair (e.g., an Off-Line Keyset 1362), is authorized to control other contracts in the system (e.g., ERC20Proxy 1310). Contracts cooperate with Custodian 1350 by awaiting an approval from Custodian 1350 before executing certain actions. In turn, such approval will require a message from an authorized key pair (e.g., Off-Line Keyset 1362) authorizing the action (e.g., print tokens, limit tokens, transfer tokens, to name a few).

In embodiments, Custodian 1350 may include a range of control coding. In embodiments, control coding may include the requirement that at least two designated keysets authorize a specific action (e.g., print token). In embodiments, at the least two keysets may be a subset of a larger group of keysets (e.g., two of three designated keysets, or two of six designated keysets, or three of five designated keysets, to name a few). In embodiments, when a higher degree of security is desired, the keysets may be maintained off-line. In embodiments, when a higher degree of automation or speed to access is required, the keysets may be maintained on-line, such as in a co-located, but separate computer system that is operatively connected to a customer facing digital asset system.

In embodiments, Custodian 1350 may also exercise control over various security operations of ERC20Proxy 1310 (e.g., time locking and revocation, to name a few).

In embodiments, Custodian 1350 may have custodianship of the proxy which grants exclusive power to replace the implementation for ERC20Proxy 1310 from its current implementation (e.g., ERC20Impl 1320 (version 1)) to a new implementation (e.g., ERC20Impl 1320A (version 2)), as illustrated in FIG. 13B, discussed above. As discussed, in embodiments, only authorized and designated key sets (e.g., off-line key set 1362) will have the authority in step S1354 signers to authorize the Custodian 1350 to modify an implementation of ERC20Proxy 1310.

In embodiments, Custodian contracts with their own respective authorized designated keysets can be set up for other contracts, such as ERC20Store 1330 as also shown in FIG. 13C. Thus, by way of example, ERC20Store 1330 may designate in S1332 Custodian 1350A as a custodian for certain operations of ERC20Store. Those operations will only be executed by ERC20Store 1330 when designated keyset (such as Off-Line keyset 1362A) sends a message through the blockchain to Custodian 1350A authorizing the Custodian 1350A to authorize the ERC20Store 1330 to perform the designated function. In embodiments, the off-line keyset 1362A may be the same as, overlap with, or be different from the Off-Line Key Set 1362A which may authorize Custodian 1350 with respect to ERC20Proxy 1310.

In embodiments, custodianship of the proxy and store also grants exclusive power to pass custodianship to a new instance of Custodian. Thus, one of the technical computer problems associated with the immutability of ERC20 smart contracts on the ETHEREUM blockchain has been solved, thus allowing for a self-upgrade of custodianship. In embodiments, since a set of signers for a given instance of a Custodian is fixed, a change to the off-line keyset may be implemented instead having a current Custodian authorize itself to be replaced by a new instance of Custodian with a new set of signers.

Figure 13D:
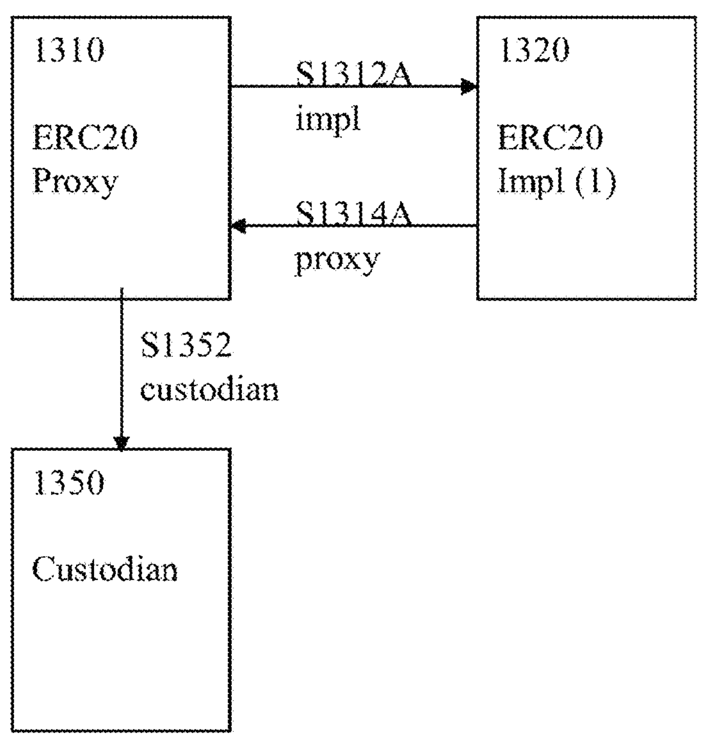
Figure 13E:
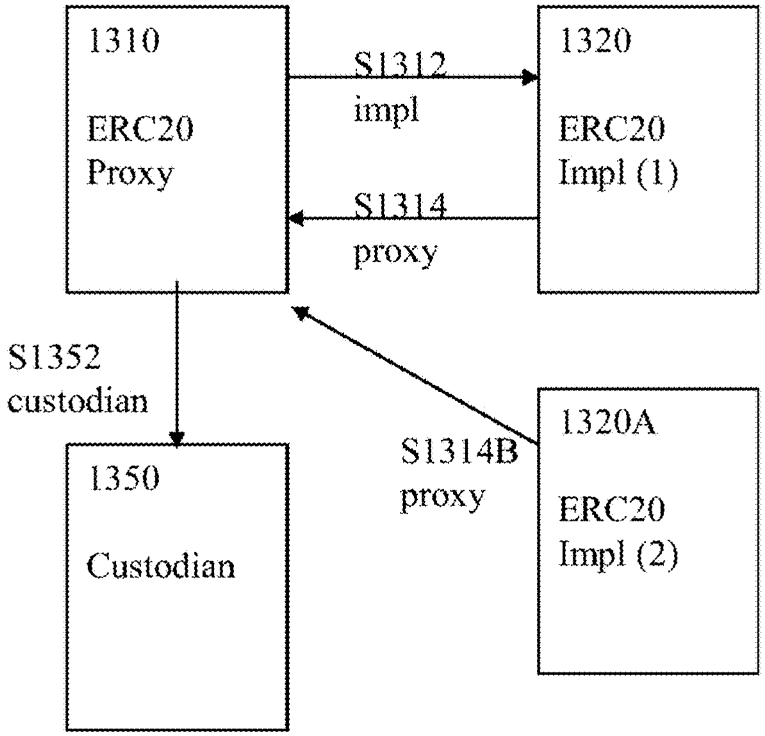
Figure 13F:
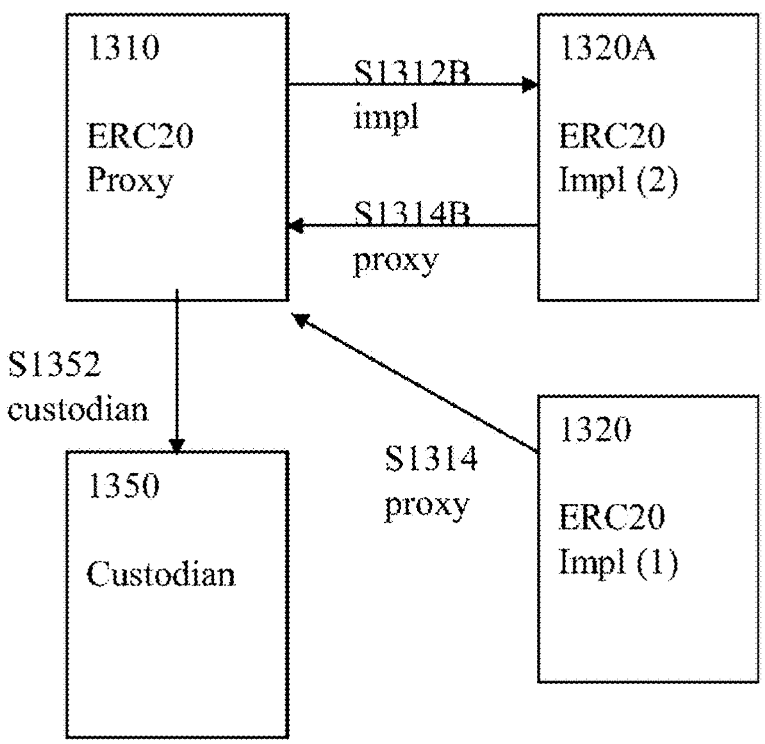
Figure 13G:
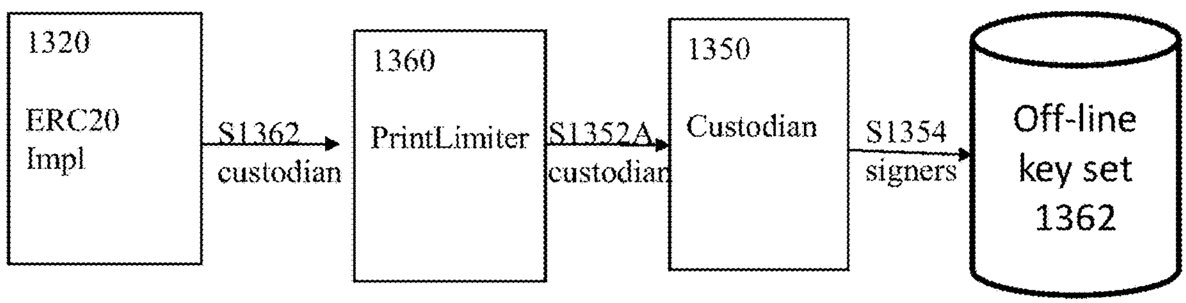
Figure 13H:
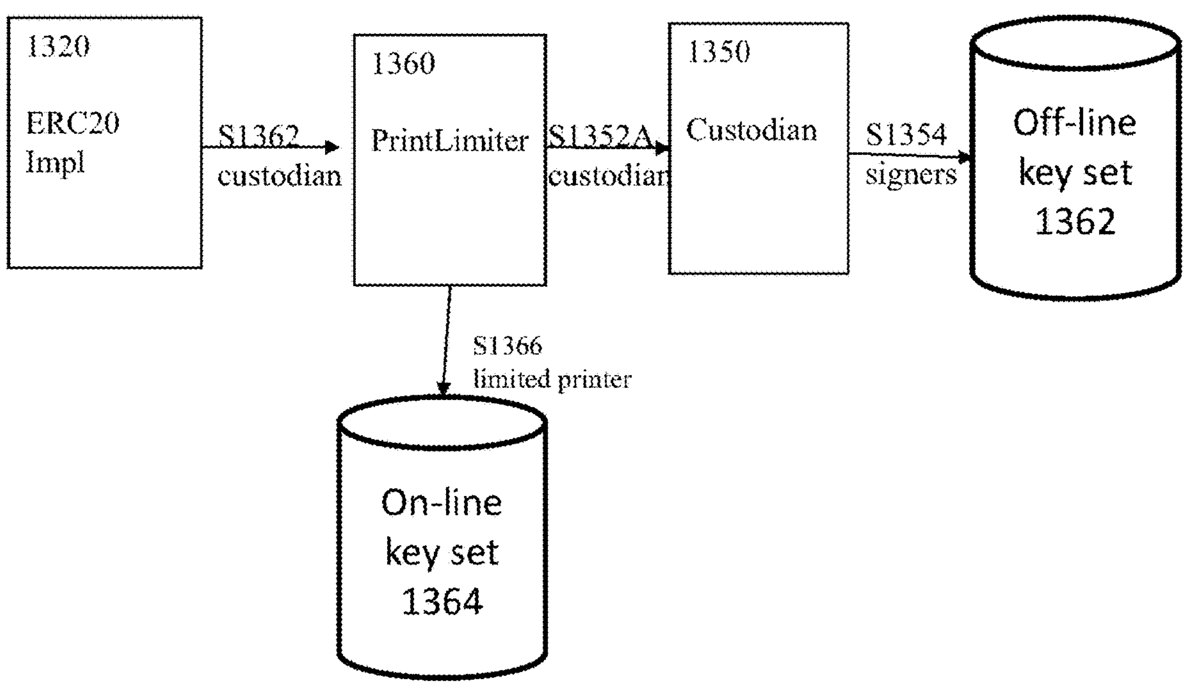

Referring now to FIGS. 13D-13F, an exemplary process of upgrading active implementation of the pointer relationship of ERCProxy 1310 from ERC20Impl 1320 (version 1) to ERC20Impl 1320A (version 2) will now be discussed.

FIG. 13D reflects the initial state in which ERC20Proxy 1310 has Custodian 1350 and in S1312A implemented ERC20 Impl 1320 (version 1) to act as a proxy in 51314A for certain functions of ERC20Proxy 1310.

To swap out the current ERC20Impl 1320 (version 1) with an updated ERC20Impl 1320 (version 2), as shown in FIG. 13E, the coding for ERC20 Impl 1320 (version 2) needs to be deployed on the blockchain and set its proxy point (S1314B proxy) to the same ERC20Proxy 1310.

Next, the implementation pointer from ERC20Proxy 1310 which is currently set at S1312 (impl) to point to ERC20Impl 1320 (Version 1), needs to be reset to be S1312B "impl" to point to ERC20Impl 1320A (version 2) instead. This change requires the authorization of Custodian 1350, which in turn requires two signatures from keys in its designated keyset (e.g., Off-Line Keyset 1362) sent to it on the blockchain.

Table 3 represents an exemplary embodiment of the steps used to implement this process:

TABLE 3

| |
|---|
| 1. lockID = proxy.requestImplChange(imp_2) |
| 2. request= custodian.requestUnlock(lockId,proxy.confirmImpl.Change) |
| 3. Off-line signing of request |
| 4. custodian.completeUnlock (request, signature_1, signature 2) |
| a. proxy.confirmImplChange(lockID) |

Referring to Table 3, in step 1, a request must be made to ERC20Proxy to change its instance of ERC20Impl. This request may come from any address, and when the request is made, the function returns a unique lockId that anyone can use to look up that request.

Next, in step 2, to confirm the pending request, the Custodian contract 1350 for ERC20 Proxy 1310 calls requestUnlock and passes as arguments the lockId generated for the change request, and the function in ERC20Proxy 1310 the Custodian 1350 needs to call to confirm the change request. This generates a request, which is a unique identifier for this unlock request.

In step 3, to complete the unlocking of Custodian and therefore propagate the change to ERC20Proxy 1310, the digital asset system operated by the token issuer uses its off-line key storage infrastructure to sign the request with the previously approved designated key sets. In this example, two signatures are required (signature 1 and signature 2), but other combinations of signatures may be used consistent with embodiments of the present invention.

In step 4, those signatures are passed into the Custodian's completeUnlock function along with the initial request. Once the request is validated against the signatures, completeUnlock parses the content of the request and issues the command. In this case, it calls ERC20Proxy's confirmImplChange using the lockId generated in the initial ERC20Impl change request.

As shown in FIG. 13F, ERC20Proxy 1310 now points with S1312B to the updated ERC20Impl 1320A (version 2) contract, thus delegating all future calls from ERC20Proxy 1310 to the updated contract ERC20 Impl (version 2) 1320A. This process can be repeated in the future to upgrade the ERC20 Impl (version 2) 1320A to new versions as authorized by the Custodian 1350.

In embodiments, a similar process may also be used to upgrade the active Custodian 1350. Instead of the pair of functions requestImplChange and confirmImplChange, the pair of functions requestCustodianChange and confirmCustodianChange are used instead.

Referring to FIGS. 13G and 13H, a PrintLimiter 1360 contract may also be used as an upgradeable limit on the token supply available.

In the context of FIG. 13G, ERC20Impl 1320 allows printing an unbounded amount of tokens to any arbitrary address. This printing can only be done by PrintLimiter 1360 contract, which serves as ERC20Impl's custodian. However, PrintLimiter 1360 can only call this unbounded printing if it receives a call from its custodian, a separate contract named Custodian 1350, which is in turned controlled by signatures from designated keysets (e.g., Off-Line Key Set 1362).

Thus, to print an unbounded amount of tokens, signatures from keys in Off-Line Key Set 1362 need to be sent through the blockchain, to Custodian 1350, which, in turn, then calls through the blockchain, PrintLimiter 1360, which then, in turn, calls through the blockchain ERC20Impl 1320 to confirm the print request.

Referring to FIG. 13H, a limited printing option may also be implemented. Thus, In embodiments, consistent with FIG. 13H, ERC20Impl 1320 allows either printing an unbounded amount (which originates from Off-Line Key Set 1362 as described earlier), or a limited amount which does not require the Off-Line Key Set 1362 to enact. Within PrintLimiter 1360 is a "total supply ceiling" variable: a maximum total supply of tokens that any "limited print" operation cannot exceed. This value is set by Off-Line Key Set 1362. PrintLimiter 1360 allows printing new tokens while remaining under that ceiling from a special hot wallet address. That hot wallet address can call PrintLimiter 1360 directly, which then calls ERC20Impl 1320 to confirm the "limited" print operation. In embodiments, limits may also be expressed in units of tokens to be issued, time periods or units of tokens per unit of time. In embodiments, for higher risk activities, a time delay may be implemented even where the activity is authorized. For example, where a large number of tokens are to be printed, a time delay of, e.g., 15 minutes, may be implemented even after authorization is confirmed.

The total supply ceiling can only be raised by Off-Line Key Set 1362. In embodiments, it can be lowered, however, by On-Line Key Set 1364 or Off-Line Key Set 1362.

Table 4 illustrates exemplary embodiments of code used in smart contracts on the ETHEREUM blockchain which implement a cooperative relationship with an external account or contract that exerts custodianship over the contract following the pattern.

A contract following this type of pattern is capable of carrying out some action-a portion of the desired operations; however, rather than executing the action directly, the action is first requested, with a unique 'lock identifier' returned as the result of the request. The pending action is stored in the contract state, storing the data necessary to execute the action in the future, and with the lock identifier as the lookup key to retrieve the pending action. If the contract is called by its custodian, receiving a lock identifier as an argument, then the associated pending action, if any, is retrieved and executed.

In embodiments, as illustrated in Table 4, the contracts may include multiple inheritances, so for the purposes of code reuse, a function for generating unique lock identifiers is implemented in the contract LockRequestable.

TABLE 4

```
contract LockRequestable {
  uint256 public lockRequestCount;
  function LockRequestable( ) public {
    lockRequestCount = 0;
  }
  function generateLockId( ) internal returns (bytes32 lockId) {
```

TABLE 4-continued

```
    return keccak256(block.blockhash(block.number - 1),
    address(this), ++lockRequestCount);
  }
}
```

In embodiments, the function generateLockId returns a 32-byte value to be used as a lock identifier, which is a hash of the following three components: (1) The blockhash of the ETHEREUM block prior to the block that included the ETHEREUM transaction that executed this function; (2) The deployed address of the instance of the contract that inherits from LockRequestable; and (3) The current value of the count of all invocations of generateLockId (within 'this' contract).

Component three plays the role of a nonce (in cryptography, a nonce is an arbitrary number that can be used just once) ensuring that a unique lock identifier is generating no matter how many invocations of generateLockId there are within a single ETHEREUM transaction or a single ETHEREUM block.

Component two ensures that the lock identifier is unique among the set of cooperating contracts that use this identifier generation scheme. A noncooperative contract authored by a third party may choose to generate identifiers that overlap, but that is expected not to impact operation.

Finally, component one uses the relative previous blockhash to make future lock identifiers unpredictable.

Table 5 illustrates embodiments of code which uses LockRequestable in a template consistent with embodiments of the present invention.

TABLE 5

```
contract C is ..., LockRequestable {
  struct PendingAction {
    t v;
    ...
  }
  address public custodian;
  mapping (bytes32 => PendingAction) public pending ActionMap;
  function C(address_custodian, ...) public {
    custodian = _custodian;
    ...
  }
  modifier onlyCustodian {
    require(msg.sender == custodian);
    _;
  }
  function requestAction(t _v, ...) public returns (bytes32 lockId) {
    require(_v != 0);
    lockId = generateLockId( );
    pendingActionMap[lockId] = PendingAction({
      v: _v;
      ...
    });
    emit ActionLocked(lockId, _v, ...);
  }
  function confirm Action(bytes32 _lockId) public onlyCustodian {
    PendingAction storage pendingAction = pendingActionMap[_lockId];
    t v = pendingAction.v;
    require(v != 0);
    ... // copy any other data from pendingAction
    delete pending ActionMap[_lockId];
    ... // execute the action
    emit ActionConfirmed(_lockId, v, ... );
  }
  event ActionLocked(bytes32 _lockId, t _v, ... );
  event ActionConfirmed(bytes32 _lockId, t _v, ... );
}
```

The function requestAction generates a fresh lock identifier and captures the request parameters as a pending action, storing it in a mapping associated with the lock identifier.

The function confirmAction is callable only by the designated custodian. The given lock identifier is used to retrieve the associated pending action from the contract storage, if it exists, otherwise the function reverts. The pending action is deleted from storage, which ensures that the action will be executed at most once. Finally, the logic of the action is executed.

In embodiments, there are two requirements to the confirmAction callback function: (1) The function does not have a return value; and (2) The function must only revert if there is no pending action associated with the lock identifier.

In these embodiments, the custodian receives a failure signal only when it called with an invalid lock identifier. Any failure cases that may occur in the execution of the action logic must be signaled by means other than return values or reversions (including abortive statements such as throw).

Programming consistent with Tables 4 and 5 may be used to implement a wide variety of functions in the context of a token including, by way of example:

- Contracts that inherit from the ERC20ImplUpgradeable contract (e.g., ERC20Proxy and ERC20Store) control updates to the address that references an instance of the ERC20Impl contract;
- The ERC20Impl contract to control increases to the token supply;
- The ERC20Holder contract to control 'withdrawal' transfers out of its balance;
- The PrintLimiter contract to control increases to its token supply ceiling state; and
- Contracts that inherit from the CustodianUpgradeable contract (e.g., ERC20Proxy, ERC20Impl, and ERC20Store) to control the passing of custodianship itself from the current custodian to a new custodian, to name a few.

In embodiments, other limits or controls may also be built into the smart contract functionality of the token. For example, in embodiments, it may be necessary for the token issuer to adjust the token ledger to account for regulatory activity. For example, there may be a court ordered seizure of funds, or a security issue that may require reversing transactions during a compromised period, to name a few.

In embodiments, as discussed below, an exchange system may include fraud management computer system 5160. In embodiments, the administrator system and/or stable value token issuer system may include, or be operably connected to, fraud management computer system 5160 or a comparable fraud management computer system. In embodiments, the fraud management computer system may be operated by the exchange, the administrator, the stable value token issuer or a third party, to name a few.

In embodiments, the fraud management computer system may monitor the blockchain to identify public addresses to and/or from which Stable Value Tokens may be transferred. In embodiments, the fraud management computer system may compare the identified public addresses to one or more lists of suspicious public addresses. In embodiments, where one of the identified public addresses corresponds to a suspicious public address, a report may be issued to reflect possible suspicious activity. In embodiments, the report may be provided to the exchange, administrator, or stable value token issuer and/or regulatory or law enforcement authorities. In embodiments, the exchange system, administrator system and/or stable value token issuer system may block a transaction to and/or from a suspicious public address. In embodiments, the exchange system, administrator system and/or stable value token issuer system may freeze any Stable Value Tokens associated with the suspicious public address. In embodiments, the exchange system, administrator system and/or stable value token issuer system may reverse a transfer of Stable Value Tokens to and/or from the suspicious address.

In embodiments, the fraud management computer system may be operably connected to ledger information and/or other relevant data to monitor the creation, destruction and/or transfer of the Stable Value Tokens to identify suspicious and/or potentially fraudulent and/or criminal activity. In embodiments, the fraud management computer system will monitor activity and compare it to a suspicious activity database. In embodiments, in the event that suspicious, possibly fraudulent and/or possibly criminal activity is identified, the fraud management computer system may generate a report identifying such activity. In embodiments, the report may be provided to the exchange, the administrator and/or the stable value token issuer and/or may be sent to regulatory or law enforcement authorities. In embodiments, depending on the nature of the activity identified in the report, action may be taken which may include, but is not limited to, freezing an account, blocking a transaction involving the Stable Value Token on the blockchain and/or modifying account information, to name a few.

In embodiments, the fraud management computer system may: (1) identify and assess the full range of fraud-related and similar risk areas, including market manipulation; (2) provide procedures and/or controls to protect against identified risks; (3) allocate responsibility for monitoring risks; and/or (4) periodically or aperiodically evaluate and/or revise these procedures, controls and/or monitoring processes, to name a few.

In embodiments, as noted above, upon discovery of any wrongdoing or suspected wrongdoing, the fraud management computer system may generate reports to the appropriate regulatory agency or agencies, including but not limited to: (1) a report stating all pertinent details known; (2) a supplemental report of any material developments relating to the originally reported events; (3) a statement of the actions taken (or proposed to be taken) with respect to such developments; and (4) a statement of changes, if any, in the entities' operations that have been put in place, or are planned, in order to avoid repetition of similar events, to name a few.

In embodiments, the fraud management computer system may freeze, temporarily and permanently, the use of and/or access to Stable Value Tokens (SVCoins) and/or fiat currency held or controlled by the exchange, administrator and/or stable value token issuer. In embodiments, a Stable Value Token and/or fiat currency available on redemption of the Stable Value Token may be forfeited if the Stable Value Token is being used for or has been used for illegal activity. In embodiments, in the event that a legal order or other legal process requires the exchange, administrator and/or stable value token issuer to do so, any Stable Value Token and/or the flat currency available upon exchange of the Stable Value Token may be subject to forfeiture to, or seizure by, a law enforcement agency. In embodiments, any Stable Value Token and/or fiat currency available upon exchange of Stable Value Token that has been subject to freezing, forfeiture to or seizure by a law enforcement agency, and/or subject to any similar limitation on its use, may be wholly and permanently unrecoverable and unusable and may, in appropriate circumstances, be destroyed.

In embodiments, the administrator may send instructions to modify the token supply for one or more particular accounts. For example, the smart contract may include instructions to pause a transfer. The pause function may be a permanent pause, e.g., for a compromised account, a time limited pause, e.g., for 24 hours or 2 days, or a temporary pause which requires another instruction to reactivate the account, to name a few. Such a function could be included as an upgrade feature in a new Impl contract, or built into the smart contract to be activated when an authorized account, e.g., one or more off-line keys call upon the smart contract to implement the pause functionality, with appropriate parameters.

In embodiments, the administrator may send instructions to rebalance the token supply of one or more particular accounts. For example, the smart contract may include instructions to adjust a token balance in a designated account, e.g., by raising the balance in the designated account, lowering the balance in the designated account, or transferring some or all of the tokens in one designated account to one or more other designated accounts. Such a function could be included as an upgrade feature in a new Impl contract, or built into the smart contract to be activated when an authorized account, e.g., one or more off-line keys, call upon the smart contract to implement the pause functionality, with appropriate parameters.

Figure 15A:
FIGS. 15A-15C illustrate an exemplary dashboard of a user interface which allows registered users of a digital asset exchange to deposit and/or withdraw SVCoins (referred to as Gemini Dollars) with the digital asset exchange system in accordance with exemplary embodiments of the present invention.
Figure 15B:
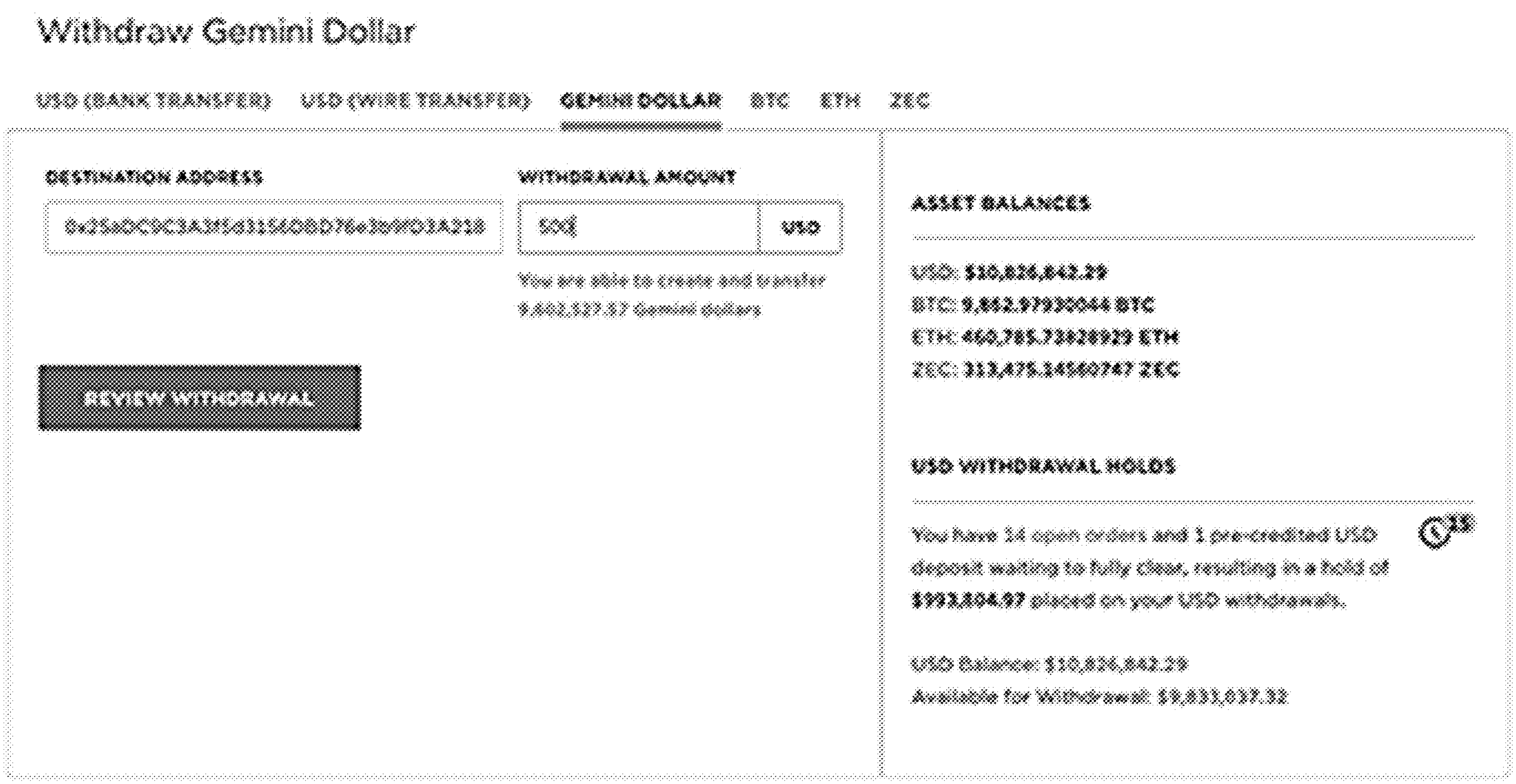
Figure 15C:
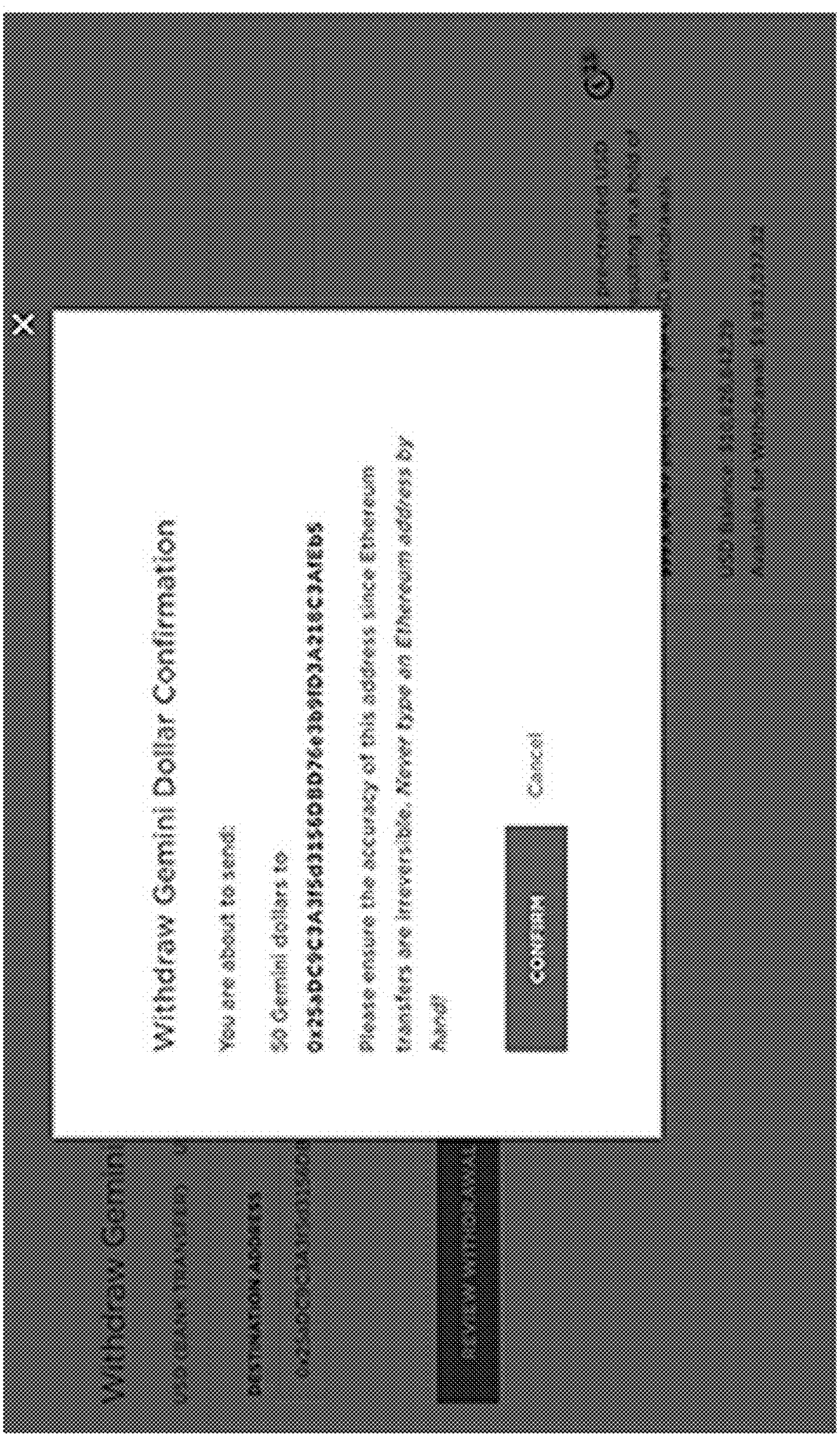

In embodiments, the Stable Value Token may be embodied in the form of a token on the ETHEREUM Blockchain, referred to as a Gemini Dollar token, as illustrated in the exemplary dashboard of FIGS. 15A-15C.

FIG. 15A illustrates an exemplary GUI for an interface with the digital asset exchange in which a user can deposit/redeem Gemini Dollar tokens into an public address associated with the digital asset exchange, in exchange for an corresponding amount of fiat in the user's account at the digital asset exchange. In embodiments, after the registered user of the exchange deposits the stable value token into the exchange's public address, the exchange will transfer from the bank account or other account associated with the stable value token, a corresponding amount of fiat, to the bank account associated with the fiat holdings of the user. In embodiments, the deposited token will then be burnt from circulation. In embodiments, the deposited token may instead of being burnt be redistributed to another customer, but in such case, an appropriate amount of fiat will need to be redeposited into the bank account or other stable investment vehicle associated with the stable value token.

In embodiments, creation and redemption of the Gemini Dollar tokens may be made simple to promote usability and encourage adoption. In embodiments, Gemini Dollar tokens are redeemed or "destroyed" at the time of deposit into a digital asset exchange. Exchange customers may exchange Gemini Dollar tokens for U.S. dollars at a 1:1 exchange rate by depositing Gemini Dollar tokens into their exchange account. The U.S. dollar amount of Gemini Dollar tokens will be credited to the customer's exchange account balance at the time of deposit.

Figure 17A:
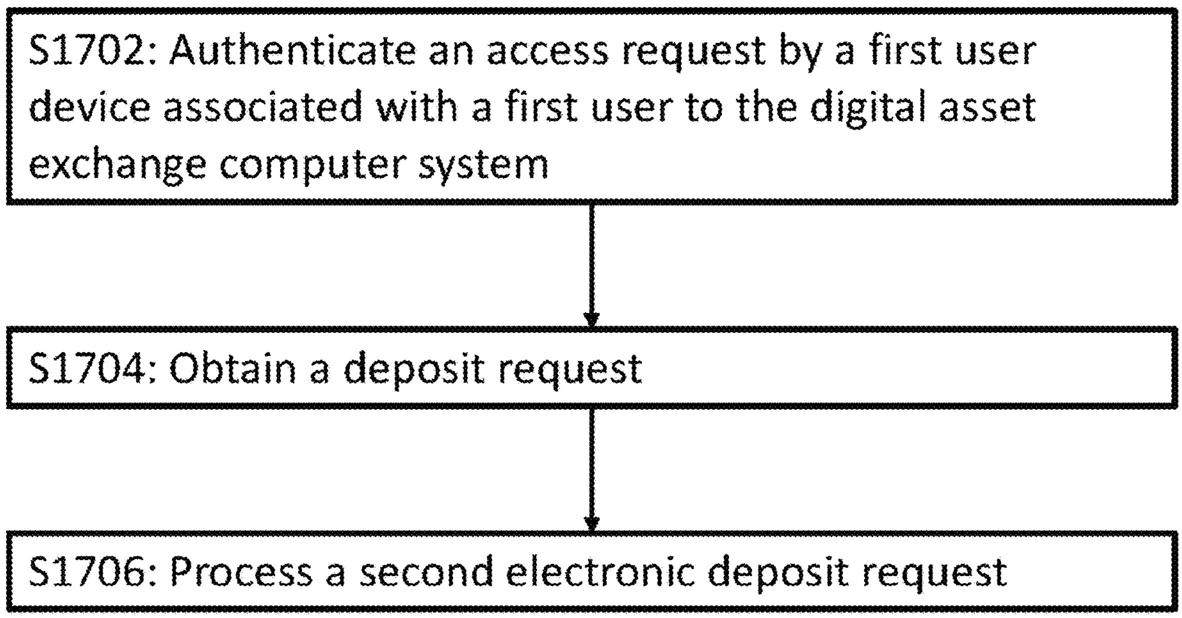
FIG. 17A is an exemplary flowchart of a process for depositing stable value digital asset tokens in accordance with exemplary embodiments in the present invention.
Figure 17B:
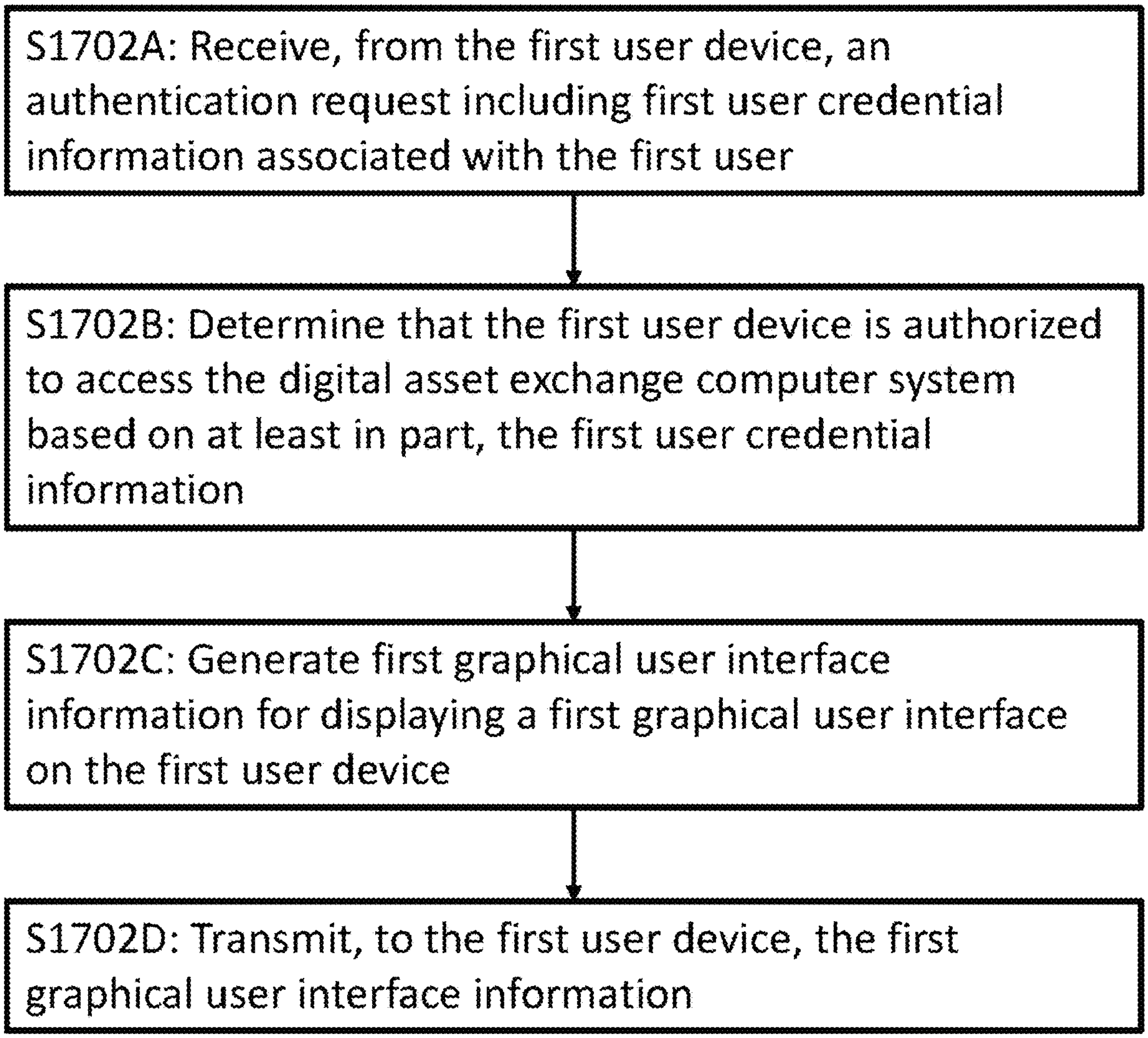
FIG. 17B is an exemplary flowchart of a process for authenticating an access request by a user device in accordance with exemplary embodiments in the present invention.

FIGS. 17A-17E illustrate an embodiment of depositing/redeeming stable value digital asset tokens (i.e., Gemini Dollar tokens) in exchange for currency (e.g., an asset which may include fiat and/or cryptocurrency, fiat, digital asset, a basket of fiat and/or digital asset, and/or a combination thereof, to name a few). For example, a first user may want to deposit stable value digital asset tokens in exchange for fiat. As another example, the first user may want to redeem stable value digital asset tokens in exchange for a second digital asset. In embodiments, the user may want to deposit/redeem stable value digital asset in exchange for one or more of: fiat, digital asset, a basket of fiat and/or digital asset, and/or a combination thereof, to name a few. Referring to FIG. 17A, the process for depositing/redeeming stable value digital asset tokens may begin with step S1702. At step S1702, in embodiments, a digital asset exchange computer system associated with a digital asset exchange may receive and/or authenticate and an access request from a first user device associated with a first user. FIG. 17B provides a more detailed illustration of an exemplary embodiment of receiving and authenticating an access request from a first user device associated with a first user that may be used in accordance with exemplary embodiments of step 1702. Referring to FIG. 17B, at step S1702A, the digital asset exchange computer system may receive an authentication request from the first user device. In embodiments, the authentication request includes first user credential information associated with the first user.

In embodiments step S1702 may continue with step S1702B. At step S1702B, in embodiments, the digital asset exchange computer system determines that the first user device is authorized to access the digital asset exchange computer system based at least on the first user credential information. In embodiments, the digital asset exchange computer system may further determine that the first user is a registered user of the digital asset exchange. In embodiments, the digital asset exchange may be licensed by a government regulatory authority. At step S1702C, the digital asset exchange computer system generates first graphical user interface (GUI) information for displaying a first graphical user interface on the first user device. FIG. 15A illustrates an example of such a first graphical user interface. At step S1702D, the digital asset exchange computer system transmits the first graphical user interface information to the first user device such that the first GUI is displayed by the first user device once machine-executable instructions associated with the first GUI information are executed by the first user device.

As described in connection with FIGS. 17A-17E, each message sent and/or received in embodiments, may be encrypted communication. The communication may be encrypted by the sender and/or receiver of the message, in embodiments. Similarly, each message may be sent and/or received via a secure channel, such as an encrypted communication. For example, each message may be using an asymmetric key, such as a PKI key, or using a symmetric key, such as used in TLS, to name a few. Each message, in embodiments, may be encrypted by a sender and/or receiver of the message (e.g., first user device and/or digital asset exchange computer system). Similarly, each transaction request, in embodiments, may be digitally signed by the digital asset exchange computer system (e.g., using a private key associated with the digital asset exchange computer system system) and/or digitally signed by the digital asset exchange computer system and the first user device (e.g., via MPC). In embodiments, each instruction included within each transaction request may be encrypted and/or digitally signed using one or more private keys associated with the digital asset exchange computer system (and/or the First user device(s)). In embodiments, such a request and/or message may be via a secure channel, such as an encrypted communication. For example, the communication may be using an asymmetric key, such as a PKI key, or using a symmetric key, such as used in TLS, to name a few. The communication, in embodiments, may be encrypted by a first user device and/or an administrator (e.g., the digital asset exchange computer system 6102).

Figure 17C:
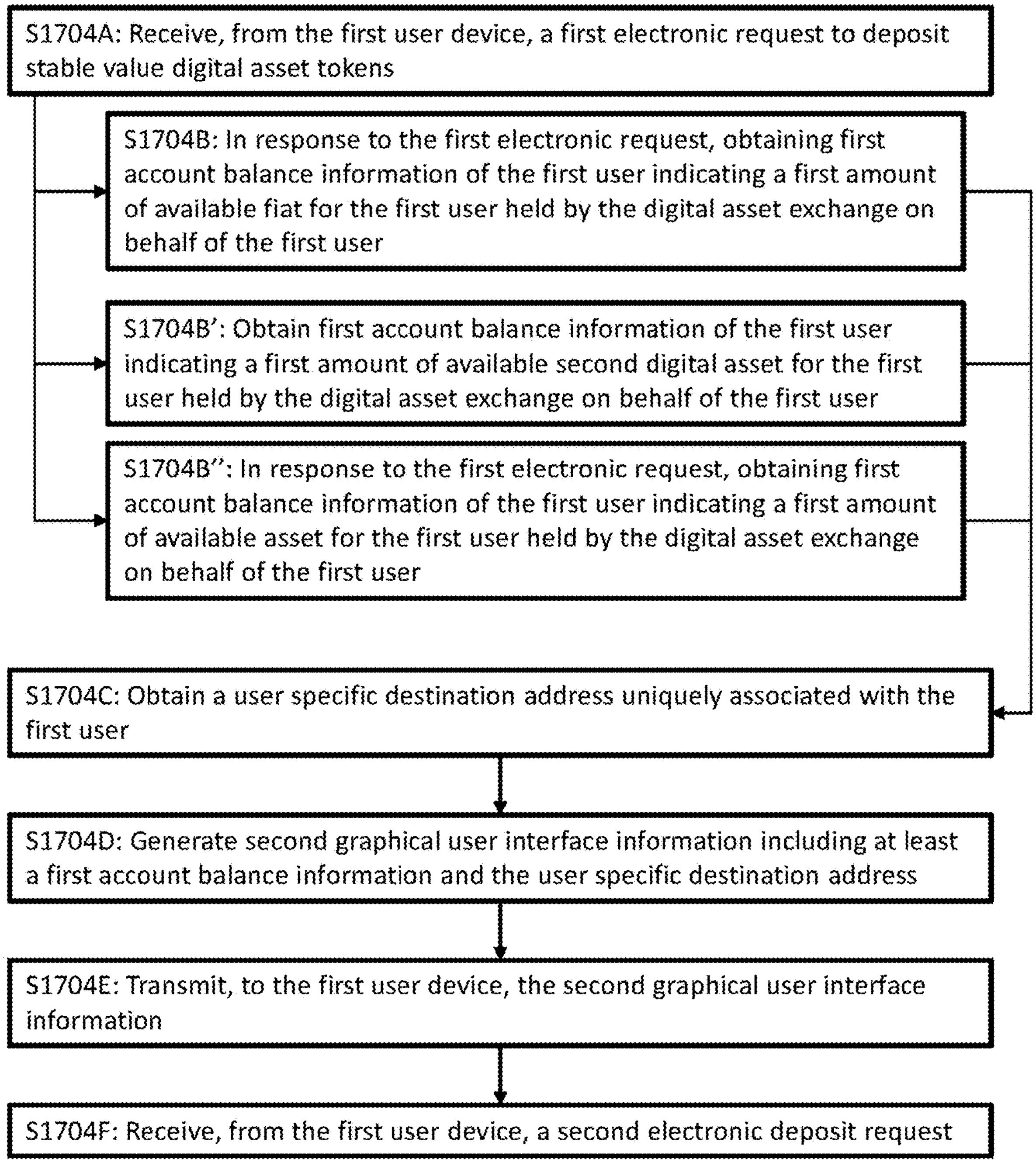
FIG. 17C is an exemplary flowchart of a process for obtaining a deposit request in accordance with exemplary embodiments in the present invention.

Referring back to FIG. 17A, in step S1704, the digital asset computer system obtains a deposit/redeem request from the first user device. FIG. 17C provides a detailed illustration of an exemplary embodiment of obtaining a deposit request that may be used in accordance with exemplary embodiments of step 1704. At step S1704A, the digital asset exchange computer system receives a first electronic request from the first user device. The first electronic request may be to deposit stable value digital asset tokens. In embodiments, each stable value digital asset token is tied to an underlying digital asset which is maintained on a distributed public transaction ledger in the form of a blockchain maintained by a plurality of geographically distributed computer systems in a peer-to-peer network in the form of the blockchain network. In embodiments, the underlying digital asset is ETHER, and the blockchain is the ETHEREUM Blockchain. In embodiments, the underlying digital asset is NEO and the blockchain is the NEO Blockchain. In embodiments, the underlying digital asset may be based on other blockchains that provide smart contract functionality.

In embodiments, as described above, a user may deposit/redeem stable value digital asset tokens in exchange for one or more of the following: fiat (as described in connection with step S1704B), a digital asset (as described in connection with step S1704B'), an asset (as described in connection with step S1704B"), a basket of assets (which may include fiat and/or digital asset(s)), and/or a combination thereof. For example, at step S1704B, in response to receiving the first electronic deposit/redeem request, the digital asset exchange computer system may obtain first account balance information of the first user. The first account balance information, in embodiments, may indicate a first amount of available fiat associated with the first user and held by the digital asset exchange on behalf of the first user. In embodiments, the digital asset exchange computer system may obtain the first amount of available fiat from a fiat account ledger database stored on a computer readable member accessible by the digital asset exchange computer system.

As another example, at step S1704B', in response to receiving the first electronic deposit/redeem request, the digital asset exchange computer system may obtain first account balance information of the first user. The first account balance information, in embodiments, may indicate a first amount of available second digital asset associated with the first user and held by the digital asset exchange on behalf of the first user (e.g., at a public address associated with the first user on the blockchain). The first account balance information, in embodiments, may be obtained based on reference to a distributed transaction ledger (e.g., a blockchain). The determination of an account balance may be a call/return to/from a public address associated with the first user (e.g., a designated public address holding second digital asset associated with the first user). In embodiments, the process of obtaining the user's available balance of second digital asset may be a query to the peer-to-peer network for a status of the distributed transaction ledger, which may result in a receipt of the status of the distributed transaction ledger which may include the balance of second digital asset at the designated public address.

As another example, at step S1704B", in response to receiving the first electronic deposit/redeem request, the digital asset exchange computer system may obtain first account balance information of the first user. The first account balance information, in embodiments, may indicate a first amount of available asset associated with the first user and held by the digital asset exchange on behalf of the first user. The first account balance information, in embodiments, may be obtained based on reference to a distributed transaction ledger (e.g., a blockchain). The first account balance information may be obtained based on reference to one or more electronic ledgers associated with and/or operatively connected to the digital asset exchange computer system.

The process for depositing/redeeming stable value digital asset tokens, in embodiments, may continue with step S1704C. At step S1704C, in embodiments, the digital asset exchange computer system obtains a user specific destination address. The user specific destination address may be uniquely associated with the first user. At step S1704D, the digital asset exchange computer system generates second graphical user interface information including at least the first account balance information and the user specific destination address. In embodiments, the graphical user interface described in step S1704D may be the graphical user interface shown in connection with FIG. 15A. At step 1704E, the digital asset exchange computer system may transmit the second graphical user interface information to the first user device. In embodiments, this may cause the first user device to display the graphical user interface shown in connection with FIG. 15A.

The process for depositing/redeeming stable value digital asset tokens, in embodiments, may continue with step S1704F. At step S1704F, in embodiments, the digital asset exchange computer system may receive a second electronic deposit request form the first user device. In embodiments, the second electronic deposit request may comprise at least: (1) a first amount of stable value digital asset tokens to be deposited; (2) a designated public address of the first user on the underlying blockchain from which the first amount of stable value digital asset tokens will be transferred; and (3) a digital signature based on a designated private key of the first user. In embodiments, the digital signature may be based on a designated private key of the first user and a private key associated with the digital asset exchange (e.g., via MPC). In embodiments, the designated private key of the first user is mathematically related to the designated public address of the first user. In embodiments, the designated private key of the first user may be stored in a custodial system, the custodial system may be part of digital asset exchange computer system, the administrator system, the stable value token issuer system or a third party system and may be accessed to provide the digital signature based on authorization of the first user. In embodiments, the first user may authorize transactions based on authentication information. In embodiments, the authentication information may include a username and password associated with the first user. In embodiments, multi-fact verification may be necessary in order for the first user to authorize the custodial system to access the designated private key and provide a digital signature to authorize a transaction. In embodiments, the multi-fact verification may include the use of an authorization code that is sent to a predetermined user device, e-mail address, or mobile phone number, to name a few, associated with the first user, for example, as used in AUTHY® (AUTHY® is a registered trademark of Twilio, Inc.). In embodiments, other multi-factor verifications may be used, such as identification of a user device associated with the first user based on phone number or mobile network, location information and shared secret verification, to name a few.

Figure 17D:
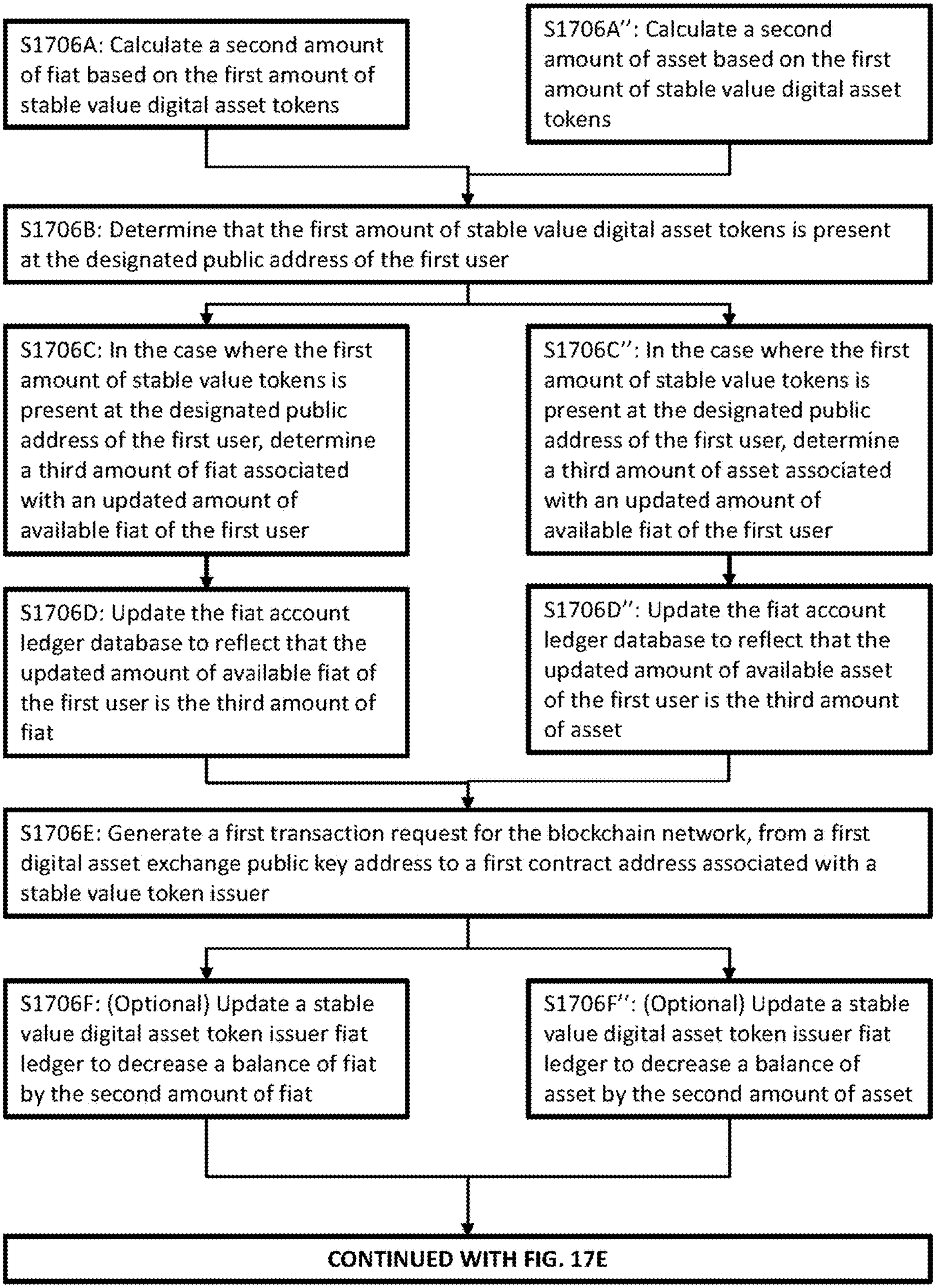
Figures 1, 17D:
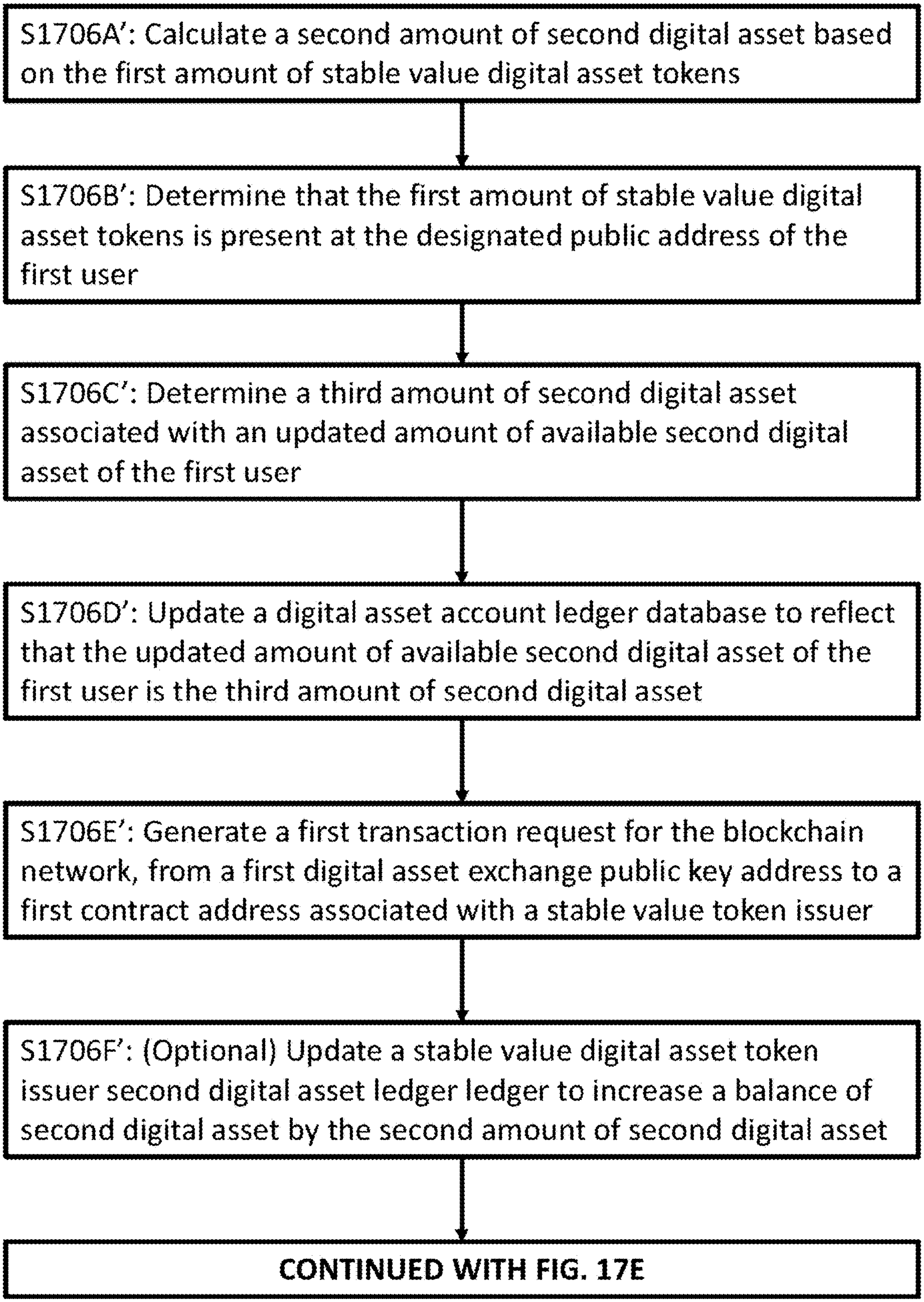

Referring back to FIG. 17A, at step S1706, the digital asset exchange computer system processes the second electronic deposit request. FIGS. 17D, 17D-1 and 17E provide a detailed illustration of an exemplary embodiment of processing the second electronic deposit request that may be used in accordance with exemplary embodiments of step S1706. Referring to FIG. 17D, processing the second electronic deposit request may continue with step S1706A. At step S1706A, in embodiments, the digital asset exchange computer system calculates a second amount of fiat based on the first amount of stable value digital asset tokens. In embodiments, the second amount of fiat is determined using a fixed predetermined ratio of stable value digital asset tokens to fiat. In embodiments, the fiat is U.S. Dollars. In the embodiments where the fiat is U.S. Dollars, the fixed predetermined ratio may be one stable value digital asset token is equal to one U.S. Dollar. In embodiments, the fixed predetermined ratio may be one hundred stable value digital asset tokes is equal to one U.S. Dollar. In embodiments, as shown in connection with step S1706A" of FIG. 17D, the digital asset exchange computer system may calculate a second amount of asset based on the first amount of stable value digital asset tokens. In embodiments, the second amount of asset is determined using a fixed predetermined ratio of stable value digital asset tokens to asset. In embodiments, as shown in connection with step S1706A' of FIG. 17D-1, the digital asset exchange computer system may calculate a second amount of second digital asset based on the first amount of stable value digital asset tokens. In embodiments, the second amount of second digital asset is determined using a fixed predetermined ratio of stable value digital asset tokens to asset (e.g., 1 Stable Value Digital Asset Token=1 Second Digital Asset).

The process, in embodiments, may continue with step S1706B of FIG. 17D and/or step S1706B' of FIG. 17D-1. Referring to FIG. 17D, at step S1706B (and step S1706B' of FIG. 17D-1), the digital asset exchange computer system may determine that the first amount of stable value digital asset tokens is present at the designated public address of the first user. For example, if the user would like to redeem 10 stable value digital asset tokens, the digital asset exchange computer system, at steps S1706B and S1706B', may confirm that the 10 stable value digital asset tokens are present in an account associated with the first user. In the case where the first amount of stable value digital asset tokens is present at the designated public address of the first user, the digital asset exchange computer system may determine an updated amount of fiat (step S1706C of FIG. 17D), second digital asset (step S1706C' of FIG. 17D-1), and/or asset (step S1706" of FIG. 17D. For example, as indicated in step S1706C, the digital asset exchange computer system may determine a third amount of fiat associated with an updated amount of available fiat of the first user. In embodiments, the third amount of fiat equals the first amount of available fiat of the first user plus the second amount of fiat. As another example, as indicated in step S1706C', the digital asset exchange computer system may determine a third amount of second digital asset associated with an updated amount of available second digital asset of the first user. In embodiments, the third amount of second digital asset equals the first amount of available second digital asset of the first user plus the second amount of second digital asset. As another example, as indicated in step S1706C", the digital asset exchange computer system may determine a third amount of asset associated with an updated amount of available asset of the first user. In embodiments, the third amount of asset equals the first amount of available asset of the first user plus the second amount of asset. In embodiments, one or more electronic ledgers may be updated by the digital asset exchange computer system to reflect the third amount of fiat (step S1706D), third amount of second digital asset (step S1706D'), and/or third amount of asset (step S1706D"). For example, at step 1706D, the digital asset computer system updates the fiat account ledger to reflect that the updated amount of available fiat of the first user is the third amount of fiat. As another example, at step S1706D', the digital asset exchange computer system updates a digital asset ledger to reflect that the updated amount of available second digital asset of the first user is the third amount of the second digital asset. As another example, at step S1706D", the digital asset exchange computer system updates a digital asset ledger to reflect that the updated amount of available asset of the first user is the third amount of the asset.

In embodiments, the process for depositing/redeeming stable value digital asset tokens may continue with step S1706E. At step S1706E, in embodiments, the digital asset exchange computer system may generate a first transaction request addressed to a first contract address associated with the stable value token issuer on the first blockchain. The transaction request, in embodiments, including instructions to: (1) a request to obtain the first amount of stable value digital asset tokens from the designated public address of the first user; and (2) a request to destroy the first amount of stable value digital asset tokens. In alternative embodiments, the first transaction request may include: (1) a request to obtain the first amount of stable value digital asset tokens from the designated public address of the first user; and (2) a request to provide the first amount of stable value digital asset tokens to a specific destination address. In embodiments, the first transaction request is signed with a generated digital signature based on the digital asset exchange private key of the digital asset exchange. The transaction request, in embodiments, may be digitally signed by the digital asset exchange computer system and/or by the digital asset exchange computer system and the first user device (e.g., via MPC)).

Similarly, at step S1706E' of FIG. 17D-1, in embodiments, the digital asset exchange computer system may generate a first transaction request addressed to a first contract address associated with the stable value token issuer on the first blockchain. The transaction request, in embodiments, including instructions to: (1) a request to obtain the first amount of stable value digital asset tokens from the designated public address of the first user; and (2) a request to destroy the first amount of stable value digital asset tokens. In alternative embodiments, the first transaction request may include: (1) a request to obtain the first amount of stable value digital asset tokens from the designated public address of the first user; and (2) a request to provide the first amount of stable value digital asset tokens to a specific destination address. In embodiments, the first transaction request is signed with a generated digital signature based on the digital asset exchange private key of the digital asset exchange. The transaction request, in embodiments, may be digitally signed by the digital asset exchange computer system and/or by the digital asset exchange computer system and the first user device (e.g., via MPC). In embodiments, the first digital asset exchange public key address is mathematically related to a first digital asset exchange private key which is stored in the computer readable member accessible by the digital asset exchange computer system.

In embodiments, prior to optional steps S1706F, S1706F', and/or S1706F", the transaction request, in embodiments, may be published to the blockchain by the digital asset exchange computer system (e.g., published to the contract address on the blockchain). The published transaction request, continuing the example, may be verified by one or more nodes on the blockchain and/or executed by one or more nodes on the blockchain. In embodiments, a transaction fee may be required by one or more nodes, e.g., a miner, to verify and/or execute the generated and/or published transaction request.

The process for depositing/redeeming a stable value digital asset token may optionally continue with step S1706F. At step S1706F, in embodiments, the digital asset exchange computer system may update a stable value digital asset token issuer fiat ledger. The update may decrease the balance of fiat by the second amount of fiat. In embodiments, the digital asset exchange computer system may transfer the second amount of flat from a stable value digital asset token issuer to a digital asset exchange fiat account. In embodiments, the digital asset exchange computer system may periodically transfer fiat between a stable value digital asset token issuer fiat account and a digital asset exchange fiat account based on net transactions over a predetermined period of time. In embodiments, at optional step S1706F' of FIG. 17D-1, the digital asset exchange computer system may update a stable value digital asset token issuer second digital asset ledger. The update may decrease the balance of second digital asset by the second amount of second digital asset. In embodiments, the digital asset exchange computer system may transfer the second amount of second digital asset from a stable value digital asset token issuer to a digital asset exchange second digital asset account. In embodiments, the digital asset exchange computer system may periodically transfer second digital asset between a stable value digital asset token issuer second digital asset account and a digital asset exchange second digital asset account based on net transactions over a predetermined period of time. In embodiments, at optional step S1706F" of FIG. 17D, the digital asset exchange computer system may update a stable value digital asset token issuer asset ledger. The update may decrease the balance of asset by the second amount of asset. In embodiments, the digital asset exchange computer system may transfer the second amount of asset from a stable value digital asset token issuer to a digital asset exchange asset account. In embodiments, the digital asset exchange computer system may periodically transfer assets between a stable value digital asset token issuer asset account and a digital asset exchange asset account based on net transactions over a predetermined period of time.

The process of depositing/redeeming stable value digital asset tokens may continue with FIG. 17E. Referring to FIG. 17E, in embodiments, the process may continue with step S1706G. At step S1706G, in embodiments, the digital asset exchange computer system may transmit the first transaction request to the blockchain network via the Internet. In embodiments, the transaction request may be published to the blockchain by the digital asset exchange computer system (e.g., published to the contract address on the blockchain). The published transaction request, continuing the example, may be verified by one or more nodes on the blockchain and/or executed by one or more nodes on the blockchain. In embodiments, a transaction fee may be required by one or more nodes, e.g., a miner, to verify and/or execute the generated and/or published transaction request.

The process of depositing/redeeming stable value digital asset tokens may continue with step S1706H. At step S1706H, the digital asset exchange system confirms, via reference to the blockchain, that the first amount of stable value digital asset tokens is not present at the designated public address of the first user. The confirmation, in embodiments, may be based on reference to a distributed transaction ledger (e.g., a blockchain). In embodiments, the digital asset exchange computer system may confirm that the designated public address of the first user has transferred the first amount of stable value digital asset tokens. The confirmation process may be a call/return to/from the designated public address. In embodiments, the confirmation process may be a query to the peer-to-peer network for a status of the distributed transaction ledger, which may result in a receipt of the status of the distributed transaction ledger which may include the transfer of the first amount of stable value digital asset tokens.

In embodiments, a method of obtaining stable value digital asset tokens may comprise the steps of: (a) providing a first designated key pair comprising a first designated public key and a corresponding first designated private key, wherein the first designated private key also corresponds to a first designated public address associated with a first underlying digital asset; wherein the first underlying digital asset is maintained on a first distributed public transaction ledger maintained in the form of a first blockchain by a first plurality of geographically distributed computer systems in a first peer-to-peer network in the form of a first blockchain network, and wherein the first designated private key is stored on a first computer system which is connected via the Internet to the first blockchain network; (b) providing a second designated key pair comprising a second designated public key and a corresponding second designated private key, wherein the second designated private key also corresponds to a second designated public address associated with the underlying digital asset; and wherein the second designated private key is stored on a second computer system which is physically separated from the first computer system and is not operatively or physically connected to the first blockchain network; (c) receiving, by an administrator system, a request to obtain a first sum of stable value digital asset tokens in exchange for a second sum of second digital asset, wherein the second digital asset is maintained on a second distributed public transaction ledger in the form of a second blockchain associated with a second underlying digital asset that is maintained by a second blockchain network including a second plurality of geographically distributed computer systems in a second peer-to-peer network, wherein the first sum corresponds to the second sum based on a fixed ratio of stable value digital asset token to second digital asset, wherein the request comes from a first requesting user with an associated first requester key pair, comprising a first requester public key and a corresponding first requester private key, and wherein the first requester private key also corresponds to a first requester public address associated with the underlying digital asset; (d) confirming, by the administrator system, receipt of the second sum of second digital asset; (e) transferring the first sum of stable value digital asset tokens to the first requester public address using the following steps: (1) sending a second request, from the administrator system to the first computer system, to obtain the first sum of stable value digital asset tokens and transfer said first sum to the first requester public address; (2) generating, by the first computer system, first instructions addressed from the first designated public address to a first contract address including a message to obtain the first sum of stable value digital asset tokens and to assign the obtained first sum to the first requester public address, wherein the first contract address is associated with the underlying digital asset, wherein the first contract address is associated with first smart contract instructions for a stable value digital asset token, and wherein the first smart contract instructions are saved as part of the first blockchain for the underlying digital asset and include: (A) token creation instructions including instructions to create tokens; (B) token transfer instructions including instructions to transfer tokens; (C) token destruction instructions including instructions to destroy tokens; (D) authorization instructions associated with the first designated key pair; and (E) authorization instructions associated with the second designated key pair; (3) digitally signing, by the first computer system, the first instructions using the first designated private key to generate first digitally signed instructions; (4) sending, from the first computer system to the plurality of geographically distributed computer systems, the first digitally signed instructions; wherein the first digitally signed instructions are executed by the plurality of geographically distributed computer systems in accordance with the first contract instructions; and (f) confirming, by the administrator system, that the first sum of stable value digital asset tokens has been obtained and transferred to the first requester public address based on reference to the first blockchain.

In embodiments, the method may further comprise the steps of: (g) receiving, by the administrator system, a third request to obtain a third sum of stable value digital asset tokens in exchange for a fourth sum of second digital asset, wherein the third sum corresponds to the fourth sum based on the fixed ratio of stable value digital asset token to second digital asset, wherein the third request comes from a second requesting user with an associated second requester key pair, comprising a second requester public key and a corresponding second requester private key, and wherein the second requester private key is associated with a second requester public address associated with the underlying digital asset; (h) confirming, by the administrator system, receipt of the fourth sum of second digital asset; (i) transferring the third sum of stable value digital asset tokens to the second requester public address using the following steps: (1) generating, by the administrator system, second instructions from the second designated public address to the first contract address to obtain the third sum of stable value digital asset tokens and transfer said third sum to the second requester public address; (2) transferring, from the administrator system to a first portable memory device, the second instructions; (3) transferring, from the first portable memory device to the second computer, the second instructions; (4) digitally signing, by the second computer, the second instructions using the second designated private key to generate second digitally signed instructions; (5) transferring, from the second computer to a second portable memory device, the second digitally signed instructions; and (6) sending, from the second portable memory device to the plurality of geographically distributed computer systems, the second digitally signed instructions; and (j) confirming, by the administrator system, that the third sum of stable value digital asset tokens have been obtained and transferred to the second requester public address based on reference to the first blockchain.

In embodiments, the step of (i)(6) includes: (A) transferring, from the second portable memory device to the administrator system, the second digitally signed instructions; and (B) transferring, from the administrator system to the plurality of geographically distributed computer systems, the second digitally signed instructions.

In embodiments, the method may further comprise the steps of: (k) providing a third designated key pair comprising a third designated public key and a corresponding third designated private key, wherein the third designated private key is stored on a third computer system which is physically separated from the first computer system and the second computer system and wherein the third computer system is not operatively connected or physically connected to the first blockchain network; wherein the first smart contract instructions include: (F) authorization instructions associated with the third designated key pair; and wherein with respect to step (i), performing the following further steps: (7) determining that the first designated key pair does not have authority to obtain the third sum of stable value digital asset tokens; (8) determining, by the administrator system, the third designated key pair and the second designated key pair together have authority to obtain the third sum, and performing the following steps: (9) generating, by the administrator system, third instructions from the third designated public address to the first contract address to obtain the third sum of stable value digital asset tokens and transfer said third sum to the second requester public address; (10) transferring, from the administrator system to a third portable memory device, the third instructions; (11) transferring, from the third portable memory device to the third computer system, the third instructions; (12) digitally signing, by the third computer system, the third instructions using the third designated private key to generate third digitally signed instructions; (13) transferring, from the third computer system to a fourth portable memory device, the third digitally signed instructions; and (14) sending, from the fourth portable memory device to the plurality of geographically distributed computer systems, the third digitally signed instructions.

In embodiments, the step (i)(14) includes the steps of: (A) transferring, from the fourth portable memory device to the administrator system, the third digitally signed instructions; and (B) transferring, from the administrator system to the plurality of geographically distributed computer systems, the third digitally signed instructions.

In embodiments, the third portable memory device and fourth portable memory device are the same portable memory device.

In embodiments, the third portable memory device and fourth portable memory device are different portable memory devices.

In embodiments, the method may further include the steps of: (k) providing a third designated key pair comprising a third designated public key and a corresponding third designated private key, wherein the third designated private key is stored on a third computer system which is physically separated from the first computer system and the second computer system and wherein the third computer system is not operatively connected or physically connected to the first blockchain network; and wherein the first smart contract instructions further include: (F) authorization instructions associated with the third key pair; and wherein with respect to step (i), performing the following further steps: (7) determining the first designated key pair does not have authority to obtain the third sum; (8) determining the first designated key pair does not have authority to obtain the third sum; (9) determining, by the administrator system, that the third designated key pair, the second designated key pair and the first designated key pair together have authority to obtain the third sum; (10) sending a fifth request, from the administrator system to the first computer system, to obtain the third sum of stable value digital asset tokens and transfer said third sum to the second requester public address; (11) generating, by the administrator system, third instructions from the third designated public address to the first contract address to obtain the third sum of stable value digital asset tokens and transfer said third sum to the second requester public address; (12) transferring, from the administrator system to a third portable memory device, the third instructions; (13) transferring, from the third portable memory device to the third computer system, the third instructions; (14) digitally signing, by the third computer system, the third instructions using the third designated private key to generate third digitally signed instructions; (15) transferring, from the third computer system to a fourth portable memory device, the third digitally signed instructions; and (16) sending, from the fourth portable memory device to the plurality of geographically distributed computer systems, the third digitally signed instructions.

In embodiments, the step (i)(16) includes: (A) transferring, from the fourth portable memory device to the administrator system, the third digitally signed instructions; and (B) transferring, from the administrator system to the plurality of geographically distributed computer systems, the third digitally signed instructions.

In embodiments, the method further includes the steps of: (k) providing, by the administrator system a ledger including first account information associated with at least the first requesting user and second account information associated with at least the second requesting user, wherein the first account information includes first stable value digital asset token balance information and the second account information includes second stable value digital asset token balance information; (1) determining, by the administrator system, a total balance of the stable value digital asset tokens based on the sum of the first stable value digital asset token balance information and the second stable value digital asset token balance information; and (m) publishing, by the administrator system, the total balance of stable value digital asset tokens.

In embodiments, the method further includes the steps of: (k) generating, by a first requester computing device associated with the first requester, a transfer message to transfer stable value digital asset tokens to the second requester public address, the transfer message including: (1) a transfer number of stable value digital asset tokens; (2) the first requester public address; (3) the second requester public address; and (4) an electronic signature based on the first requester private key; (1) publishing, by the first requester computing device to the to the plurality of geographically distributed computer systems, the transfer message; and (m) confirming, by the first requester computing device, transfer of the number of stable value digital asset tokens from the first requester public address to the second requester public address by reference to the first blockchain.

In embodiments, the first portable memory device and second portable memory device are the same portable memory device.

In embodiments, the first portable memory device and second portable memory device are different portable memory devices.

In embodiments, the fourth sum of second digital asset is deposited in one or more bank accounts associated with the administrator.

In embodiments, the fourth sum of second digital asset is used by the administrator to purchase one or more interest bearing financial instruments.

In embodiments, the authorization instructions associated with the first designated key pair include a limit on a number of tokens the first designated key pair is authorized to issue.

In embodiments, the authorization instructions associated with the first designated key pair include a time limit during which the first designated key pair is authorized to issue tokens.

In embodiments, the authorization instructions associated with the first designated key pair include a limit on a number of tokens the first designated key pair is authorized to issue over a period of time.

In embodiments, the fixed predetermined ratio is one stable value digital asset token is equal to one second digital asset.

In embodiments, the second digital asset is Bitcoin.

In embodiments, the second digital asset is Litecoin.

In embodiments, the second digital asset is Bitcoin Cash.

In embodiments, the second digital asset is Filecoin.

In embodiments, the second digital asset is Zcash.

In embodiments, the second digital asset is Stellar.

In embodiments, the second digital asset is Polkadot.

In embodiments, the second digital asset is Atom.

In embodiments, the second digital asset is Tezos.

In embodiments, the first designated public key is mathematically associated with the first designated private key.

In embodiments, the second designated public key is mathematically associated with the second designated private key.

In embodiments, the first contract instructions are based on the ERC720 standard.

In embodiments, the first blockchain is the Ethereum blockchain.

In embodiments, the first blockchain is the NEO blockchain.

In embodiments, the second sum of second digital asset is deposited in one or more bank accounts associated with the administrator.

In embodiments, the second sum of second digital asset is used by the administrator to purchase one or more interest bearing financial instruments.

In embodiments, the first request to obtain the first sum of stable value digital asset tokens specifies a requester fee payable to the administrator system in addition to the second sum of second digital asset and step (d) includes confirming, by the administrator system, receipt of the second sum of second digital asset and the requester fee.

In embodiments, the first request to obtain the first sum of stable value digital asset tokens specifies a miner fee payable to miners associated with the plurality of geographically distributed computer systems and step (d) includes confirming, by the administrator system, receipt of the second sum of second digital asset and the miner fee.

In embodiments, a method of obtaining stable value digital asset tokens may comprise the steps of: (a) providing a first designated key pair comprising a first designated public key and a corresponding first designated private key, wherein the first designated private key also corresponds to a first designated public address associated with an underlying digital asset, wherein the underlying digital asset is maintained on a first distributed public transaction ledger maintained in the form of a first blockchain by a first plurality of geographically distributed computer systems in a first peer-to-peer network in the form of a first blockchain network, and wherein the first designated private key is stored on a first computer system which is connected via the Internet to the first blockchain network; (b) providing a second designated key pair comprising a second designated public key and a corresponding second designated private key, wherein the second designated private key also corresponds to a second designated public address associated with the first underlying digital asset; and wherein the second designated private key is stored on a second computer system which is physically separated from the first computer system and is not operatively or physically connected to the first blockchain network; (c) receiving, by a digital asset exchange system, a request to obtain a first sum of stable value digital asset tokens in exchange for a second sum of second digital asset, wherein the second digital asset is maintained on a second distributed public transaction ledger in the form of a second blockchain associated with a second underlying digital asset that is maintained by a second blockchain network including a second plurality of geographically distributed computer systems in a second peer-to-peer network, wherein the first sum corresponds to the second sum based on a fixed ratio of stable value digital asset token to second digital asset, and wherein the request comes from a first requesting user with an associated first requester key pair, comprising a first requester public key and a corresponding first requester private key, wherein the first requester private key also corresponds to a first requester public address associated with the underlying digital asset; (d) confirming, by the digital asset exchange system, receipt of the second sum of second digital asset; (e) transferring the first sum of stable value digital asset tokens to the first requester public address using the following steps: (1) sending a second request, from the digital asset exchange system to the first computer system, to obtain the first sum of stable value digital asset tokens and transfer said first sum to the first requester public address; (2) generating, by the first computer system, first instructions addressed from the first designated public address to a first contract address including a message to obtain the first sum of stable value digital asset tokens and to assign the obtained first sum to the first requester public address, wherein the first contract address is associated with the underlying digital asset, wherein the first contract address is associated with first smart contract instructions for a stable value digital asset token, and wherein the first smart contract instructions are saved as part of the first blockchain for the underlying digital asset and include: (A) token creation instructions including instructions to create tokens; (B) token transfer instructions including instructions to transfer tokens; (C) token destruction instructions including instructions to destroy tokens; (D) authorization instructions associated with the first designated key pair; and (E) authorization instructions associated with the second designated key pair; (3) digitally signing, by the first computer system, the first instructions using the first designated private key to generate first digitally signed instructions; (4) sending, from the first computer system to the plurality of geographically distributed computer systems, the first digitally signed instructions; wherein the first digitally signed instructions are executed by the plurality of geographically distributed computer systems in accordance with the first contract instructions; and (f) confirming, by the digital asset exchange system, that the first sum of stable value digital asset tokens has been obtained and transferred to the first requester public address based on reference to the first blockchain.

In embodiments, the method may further comprise the steps of: (g) receiving, by the digital asset exchange system, a third request to obtain a third sum of stable value digital asset tokens in exchange for a fourth sum of second digital asset, wherein the third sum corresponds to the fourth sum based on the fixed ratio of stable value digital asset token to second digital asset, wherein the third request comes from a second requesting user with an associated second requester key pair, comprising a second requester public key and a corresponding second requester private key, and wherein the second requester private key is associated with a second requester public address associated with the underlying digital asset; (h) confirming, by the digital asset exchange system, receipt of the fourth sum of second digital asset; (i) transferring the third sum of stable value digital asset tokens to the second requester public address using the following steps: (1) generating, by the digital asset exchange system, second instructions from the second designated public address to the first contract address to obtain the third sum of stable value digital asset tokens and transfer said third sum to the second requester public address; (2) transferring, from the digital asset exchange system to a first portable memory device, the second instructions; (3) transferring, from the first portable memory device to the second computer, the second instructions; (4) digitally signing, by the second computer, the second instructions using the second designated private key to generate second digitally signed instructions; (5) transferring, from the second computer to a second portable memory device, the second digitally signed instructions; and (6) sending, from the second portable memory device to the plurality of geographically distributed computer systems, the second digitally signed instructions; and (j) confirming, by the digital asset exchange system, that the third sum of stable value digital asset tokens have been obtained and transferred to the second requester public address based on reference to the first blockchain.

In embodiments, the step of (i)(6) includes: (A) transferring, from the second portable memory device to the digital asset exchange system, the second digitally signed instructions, and (B) transferring, from the digital asset exchange system to the plurality of geographically distributed computer systems, the second digitally signed instructions.

In embodiments, the method further comprises the steps of: (k) providing a third designated key pair comprising a third designated public key and a corresponding third designated private key, wherein the third designated private key is stored on a third computer system which is physically separated from the first computer system and the second computer system and wherein the third computer system is not operatively connected or physically connected to the first blockchain network; wherein the first smart contract instructions include: (F) authorization instructions associated with the third designated key pair; and wherein with respect to step (i), performing the following further steps: (7) determining that the first designated key pair does not have authority to obtain the third sum of stable value digital asset tokens; (8) determining, by the digital asset exchange system, the third designated key pair and the second designated key pair together have authority to obtain the third sum, and performing the following steps: (9) generating, by the digital asset exchange system, third instructions from the third designated public address to the first contract address to obtain the third sum of stable value digital asset tokens and transfer said third sum to the second requester public address; (10) transferring, from the digital asset exchange system to a third portable memory device, the third instructions; (11) transferring, from the third portable memory device to the third computer system, the third instructions; (12) digitally signing, by the third computer system, the third instructions using the third designated private key to generate third digitally signed instructions; (13) transferring, from the third computer system to a fourth portable memory device, the third digitally signed instructions; and (14) sending, from the fourth portable memory device to the plurality of geographically distributed computer systems, the third digitally signed instructions.

In embodiments, step (i)(14) includes the steps of: (A) transferring, from the fourth portable memory device to the digital asset exchange system, the third digitally signed instructions; and (B) transferring, from the digital asset exchange system to the plurality of geographically distributed computer systems, the third digitally signed instructions.

In embodiments, the third portable memory device and fourth portable memory device are the same portable memory device.

In embodiments, the third portable memory device and fourth portable memory device are different portable memory devices.

In embodiments, the method further includes the steps of: (k) providing a third designated key pair comprising a third designated public key and a corresponding third designated private key, wherein the third designated private key is stored on a third computer system which is physically separated from the first computer system and the second computer system and wherein the third computer system is not operatively connected or physically connected to the first blockchain network; and wherein the first smart contract instructions further include: (F) authorization instructions associated with the third key pair; and wherein with respect to step (i), performing the following further steps: (7) determining the first designated key pair does not have authority to obtain the third sum; (8) determining the first designated key pair does not have authority to obtain the third sum; (9) determining, by the digital asset exchange system, that the third designated key pair, the second designated key pair and the first designated key pair together have authority to obtain the third sum; (10) sending a fifth request, from the digital asset exchange system to the first computer system, to obtain the third sum of stable value digital asset tokens and transfer said third sum to the second requester public address; (11) generating, by the digital asset exchange system, third instructions from the third designated public address to the first contract address to obtain the third sum of stable value digital asset tokens and transfer said third sum to the second requester public address; (12) transferring, from the digital asset exchange system to a third portable memory device, the third instructions; (13) transferring, from the third portable memory device to the third computer system, the third instructions; (14) digitally signing, by the third computer system, the third instructions using the third designated private key to generate third digitally signed instructions; (15) transferring, from the third computer system to a fourth portable memory device, the third digitally signed instructions; and (16) sending, from the fourth portable memory device to the plurality of geographically distributed computer systems, the third digitally signed instructions.

In embodiments, the step (i)(16) includes: (A) transferring, from the fourth portable memory device to the digital asset exchange system, the third digitally signed instructions; and (B) transferring, from the digital asset exchange system to the plurality of geographically distributed computer systems, the third digitally signed instructions.

In embodiments, the method further includes the steps of: (k) providing, by the digital asset exchange system a ledger including first account information associated with at least the first requesting user and second account information associated with at least the second requesting user, wherein the first account information includes first stable value digital asset token balance information and the second account information includes second stable value digital asset token balance information; (l) determining, by the digital asset exchange system, a total balance of the stable value digital asset tokens based on the sum of the first stable value digital asset token balance information and the second stable value digital asset token balance information; and (m) publishing, by the digital asset exchange system, the total balance of stable value digital asset tokens.

In embodiments, the method further includes the steps of: (k) generating, by a first requester computing device associated with the first requester, a transfer message to transfer stable value digital asset tokens to the second requester public address, the transfer message including: (1) a transfer number of stable value digital asset tokens; (2) the first requester public address; (3) the second requester public address; and (4) an electronic signature based on the first requester private key; (l) publishing, by the first requester computing device to the to the plurality of geographically distributed computer systems, the transfer message; and (m) confirming, by the first requester computing device, transfer of the number of stable value digital asset tokens from the first requester public address to the second requester public address by reference to the first blockchain.

In embodiments, the first portable memory device and second portable memory device are the same portable memory device.

In embodiments, the first portable memory device and second portable memory device are different portable memory devices.

In embodiments, the fourth sum of second digital asset is deposited in one or more bank accounts associated with the digital asset exchange.

In embodiments, the fourth sum of second digital asset is used by the digital asset exchange to purchase one or more interest bearing financial instruments.

In embodiments, the authorization instructions associated with the first designated key pair include a limit on a number of tokens the first designated key pair is authorized to issue.

In embodiments, the authorization instructions associated with the first designated key pair include a time limit during which the first designated key pair is authorized to issue tokens.

In embodiments, the authorization instructions associated with the first designated key pair include a limit on a number of tokens the first designated key pair is authorized to issue over a period of time.

In embodiments, the fixed predetermined ratio is one stable value digital asset token is equal to one second digital asset.

In embodiments, the second digital asset is Bitcoin.

In embodiments, the second digital asset is Litecoin.

In embodiments, the second digital asset is Bitcoin Cash.

In embodiments, the second digital asset is Filecoin.

In embodiments, the second digital asset is Zcash.

In embodiments, the second digital asset is Stellar.

In embodiments, the second digital asset is Polkadot.

In embodiments, the second digital asset is Atom.

In embodiments, the second digital asset is Tezos.

In embodiments, the first designated public key is mathematically associated with the first designated private key.

In embodiments, the second designated public key is mathematically associated with the second designated private key.

In embodiments, the first contract instructions are based on the ERC720 standard.

In embodiments, the first blockchain is the Ethereum blockchain.

In embodiments, the first blockchain is the NEO blockchain.

In embodiments, the second sum of second digital asset is deposited in one or more bank accounts associated with the digital asset exchange.

In embodiments, the first request to obtain the first sum of stable value digital asset tokens specifies a requester fee payable to the digital asset exchange system in addition to the second sum of second digital asset and step (d) includes confirming, by the digital asset exchange system, receipt of the second sum of second digital asset and the requester fee.

In embodiments, the first request to obtain the first sum of stable value digital asset tokens specifies a miner fee payable to miners associated with the plurality of geographically distributed computer systems and step (d) includes confirming, by the digital asset exchange system, receipt of the second sum of second digital asset and the miner fee.

In embodiments, a method of obtaining stable value digital asset tokens may comprise the steps of: (a) providing a first designated key pair comprising a first designated public key and a corresponding first designated private key, wherein the first designated private key also corresponds to a first designated public address associated with an underlying digital asset; wherein the underlying digital asset is maintained on a first distributed public transaction ledger maintained in the form of a first blockchain by a plurality of geographically distributed computer systems in a first peer-to-peer network in the form of a first blockchain network, and wherein the first designated private key is stored on a first computer system which is connected via the Internet to the first blockchain network; (b) providing a second designated key pair comprising a second designated public key and a corresponding second designated private key, wherein the second designated private key also corresponds to a second designated public address associated with the underlying digital asset; and wherein the second designated private key is stored on a second computer system which is physically separated from the first computer system and is not operatively or physically connected to the first blockchain network; (c) receiving, by a digital asset token issuer system, a request to obtain a first sum of stable value digital asset tokens in exchange for a second sum of second digital asset, wherein the second digital asset is maintained on a second distributed public transaction ledger in the form of a second blockchain associated with a second underlying digital asset that is maintained by a second blockchain network including a second plurality of geographically distributed computer systems in a second peer-to-peer network, wherein the first sum corresponds to the second sum based on a fixed ratio of stable value digital asset token to second digital asset, wherein the request comes from a first requesting user with an associated first requester key pair, comprising a first requester public key and a corresponding first requester private key, and wherein the first requester private key also corresponds to a first requester public address associated with the underlying digital asset; (d) confirming, by the digital asset token issuer system, receipt of the second sum of second digital asset; (e) transferring the first sum of stable value digital asset tokens to the first requester public address using the following steps: (1) sending a second request, from the digital asset token issuer system to the first computer system, to obtain the first sum of stable value digital asset tokens and transfer said first sum to the first requester public address; (2) generating, by the first computer system, first instructions addressed from the first designated public address to a first contract address including a message to obtain the first sum of stable value digital asset tokens and to assign the obtained first sum to the first requester public address, wherein the first contract address is associated with the underlying digital asset, wherein the first contract address is associated with first smart contract instructions for a stable value digital asset token, and wherein the first smart contract instructions are saved as part of the first blockchain for the underlying digital asset and include: (A) token creation instructions including instructions to create tokens; (B) token transfer instructions including instructions to transfer tokens; (C) token destruction instructions including instructions to destroy tokens; (D) authorization instructions associated with the first designated key pair; and (E) authorization instructions associated with the second designated key pair; (3) digitally signing, by the first computer system, the first instructions using the first designated private key to generate first digitally signed instructions; (4) sending, from the first computer system to the plurality of geographically distributed computer systems, the first digitally signed instructions; wherein the first digitally signed instructions are executed by the plurality of geographically distributed computer systems in accordance with the first contract instructions; and (f) confirming, by the digital asset token issuer system, that the first sum of stable value digital asset tokens has been obtained and transferred to the first requester public address based on reference to the first blockchain.

In embodiments, the method further comprises the steps of: (g) receiving, by the digital asset token issuer system, a third request to obtain a third sum of stable value digital asset tokens in exchange for a fourth sum of second digital asset, wherein the third sum corresponds to the fourth sum based on the fixed ratio of stable value digital asset token to second digital asset, wherein the third request comes from a second requesting user with an associated second requester key pair, comprising a second requester public key and a corresponding second requester private key, and wherein the second requester private key is associated with a second requester public address associated with the underlying digital asset; (h) confirming, by the digital asset token issuer system, receipt of the fourth sum of second digital asset; (i) transferring the third sum of stable value digital asset tokens to the second requester public address using the following steps: (1) generating, by the digital asset token issuer system, second instructions from the second designated public address to the first contract address to obtain the third sum of stable value digital asset tokens and transfer said third sum to the second requester public address; (2) transferring, from the digital asset token issuer system to a first portable memory device, the second instructions; (3) transferring, from the first portable memory device to the second computer, the second instructions; (4) digitally signing, by the second computer, the second instructions using the second designated private key to generate second digitally signed instructions; (5) transferring, from the second computer to a second portable memory device, the second digitally signed instructions; and (6) sending, from the second portable memory device to the plurality of geographically distributed computer systems, the second digitally signed instructions; and (j) confirming, by the digital asset token issuer system, that the third sum of stable value digital asset tokens have been obtained and transferred to the second requester public address based on reference to the first blockchain.

In embodiments, the step of (i)(6) includes: (A) transferring, from the second portable memory device to the digital asset token issuer system, the second digitally signed instructions; and (B) transferring, from the digital asset token issuer system to the plurality of geographically distributed computer systems, the second digitally signed instructions.

In embodiments, the method further comprises the steps of: (k) providing a third designated key pair comprising a third designated public key and a corresponding third designated private key, wherein the third designated private key is stored on a third computer system which is physically separated from the first computer system and the second computer system and wherein the third computer system is not operatively connected or physically connected to the first blockchain network; wherein the first smart contract instructions include: (F) authorization instructions associated with the third designated key pair; and wherein with respect to step (i), performing the following further steps: (7) determining that the first designated key pair does not have authority to obtain the third sum of stable value digital asset tokens; (8) determining, by the digital asset token issuer system, the third designated key pair and the second designated key pair together have authority to obtain the third sum, and performing the following steps: (9) generating, by the digital asset token issuer system, third instructions from the third designated public address to the first contract address to obtain the third sum of stable value digital asset tokens and transfer said third sum to the second requester public address; (10) transferring, from the digital asset token issuer system to a third portable memory device, the third instructions; (11) transferring, from the third portable memory device to the third computer system, the third instructions; (12) digitally signing, by the third computer system, the third instructions using the third designated private key to generate third digitally signed instructions; (13) transferring, from the third computer system to a fourth portable memory device, the third digitally signed instructions; and (14) sending, from the fourth portable memory device to the plurality of geographically distributed computer systems, the third digitally signed instructions.

In embodiments, step (i)(14) includes the steps of: (A) transferring, from the fourth portable memory device to the digital asset token issuer system, the third digitally signed instructions; and (B) transferring, from the digital asset token issuer system to the plurality of geographically distributed computer systems, the third digitally signed instructions.

In embodiments, the third portable memory device and fourth portable memory device are the same portable memory device.

In embodiments, the third portable memory device and fourth portable memory device are different portable memory devices.

In embodiments, the method further includes the steps of: (k) providing a third designated key pair comprising a third designated public key and a corresponding third designated private key, wherein the third designated private key is stored on a third computer system which is physically separated from the first computer system and the second computer system and wherein the third computer system is not operatively connected or physically connected to the first blockchain network; and wherein the first smart contract instructions further include: (F) authorization instructions associated with the third key pair; and wherein with respect to step (i), performing the following further steps: (7) determining the first designated key pair does not have authority to obtain the third sum; (8) determining the first designated key pair does not have authority to obtain the third sum; (9) determining, by the digital asset token issuer system, that the third designated key pair, the second designated key pair and the first designated key pair together have authority to obtain the third sum; (10) sending a fifth request, from the digital asset token issuer system to the first computer system, to obtain the third sum of stable value digital asset tokens and transfer said third sum to the second requester public address; (11) generating, by the digital asset token issuer system, third instructions from the third designated public address to the first contract address to obtain the third sum of stable value digital asset tokens and transfer said third sum to the second requester public address; (12) transferring, from the digital asset token issuer system to a third portable memory device, the third instructions; (13) transferring, from the third portable memory device to the third computer system, the third instructions; (14) digitally signing, by the third computer system, the third instructions using the third designated private key to generate third digitally signed instructions; (15) transferring, from the third computer system to a fourth portable memory device, the third digitally signed instructions; and (16) sending, from the fourth portable memory device to the plurality of geographically distributed computer systems, the third digitally signed instructions.

In embodiments, the step (i)(16) includes: (A) transferring, from the fourth portable memory device to the digital asset token issuer system, the third digitally signed instructions; and (B) transferring, from the digital asset token issuer system to the plurality of geographically distributed computer systems, the third digitally signed instructions.

In embodiments, the method further includes the steps of: (k) providing, by the digital asset token issuer system a ledger including first account information associated with at least the first requesting user and second account information associated with at least the second requesting user, wherein the first account information includes first stable value digital asset token balance information and the second account information includes second stable value digital asset token balance information; (l) determining, by the digital asset token issuer system, a total balance of the stable value digital asset tokens based on the sum of the first stable value digital asset token balance information and the second stable value digital asset token balance information; and (m) publishing, by the digital asset token issuer system, the total balance of stable value digital asset tokens.

In embodiments, the method further includes the steps of: (k) generating, by a first requester computing device associated with the first requester, a transfer message to transfer stable value digital asset tokens to the second requester public address, the transfer message including: (1) a transfer number of stable value digital asset tokens; (2) the first requester public address; (3) the second requester public address; and (4) an electronic signature based on the first requester private key; (l) publishing, by the first requester computing device to the to the plurality of geographically distributed computer systems, the transfer message; and (m) confirming, by the first requester computing device, transfer of the number of stable value digital asset tokens from the first requester public address to the second requester public address by reference to the first blockchain.

In embodiments, the first portable memory device and second portable memory device are the same portable memory device.

In embodiments, the first portable memory device and second portable memory device are different portable memory devices.

In embodiments, the fourth sum of second digital asset is deposited in one or more bank accounts associated with the digital asset token issuer.

In embodiments, the fourth sum of second digital asset is used by the digital asset token issuer to purchase one or more interest bearing financial instruments.

In embodiments, the authorization instructions associated with the first designated key pair include a limit on a number of tokens the first designated key pair is authorized to issue.

In embodiments, the authorization instructions associated with the first designated key pair include a time limit during which the first designated key pair is authorized to issue tokens.

In embodiments, the authorization instructions associated with the first designated key pair include a limit on a number of tokens the first designated key pair is authorized to issue over a period of time.

In embodiments, the fixed predetermined ratio is one stable value digital asset token is equal to one second digital asset.

In embodiments, the second digital asset is Bitcoin.

In embodiments, the second digital asset is Litecoin.

In embodiments, the second digital asset is Bitcoin Cash.

In embodiments, the second digital asset is Filecoin.

In embodiments, the second digital asset is Zcash.

In embodiments, wherein the second digital asset is Stellar.

In embodiments, the second digital asset is Polkadot.

In embodiments, the second digital asset is Atom.

In embodiments, the second digital asset is Tezos.

In embodiments, the first designated public key is mathematically associated with the first designated private key.

In embodiments, the second designated public key is mathematically associated with the second designated private key.

In embodiments, the first contract instructions are based on the ERC720 standard.

In embodiments, the first blockchain is the Ethereum blockchain.

In embodiments, the first blockchain is the NEO blockchain.

In embodiments, the second sum of second digital asset is deposited in one or more bank accounts associated with the digital asset token issuer.

In embodiments, the second sum of second digital asset is used by the digital asset token issuer to purchase one or more interest bearing financial instruments.

In embodiments, the first request to obtain the first sum of stable value digital asset tokens specifies a requester fee payable to the digital asset token issuer system in addition to the second sum of second digital asset and step (d) includes confirming, by the digital asset token issuer system, receipt of the second sum of second digital asset and the requester fee.

In embodiments, the first request to obtain the first sum of stable value digital asset tokens specifies a miner fee payable to miners associated with the plurality of geographically distributed computer systems and step (d) includes confirming, by the digital asset token issuer system, receipt of the second sum of second digital asset and the miner fee.

In embodiments, a method of obtaining stable value digital assets tokens may comprise the steps of: (a) providing a first designated key pair comprising a first designated public key and a corresponding first designated private key, wherein the first designated private key also corresponds to a first designated public address associated with an underlying digital asset; wherein the underlying digital asset is maintained on a distributed public transaction ledger maintained in the form of a blockchain by a plurality of geographically distributed computer systems in a peer-to-peer network in the form of a blockchain network, and wherein the first designated private key is stored on a first computer system which is connected via the Internet to the blockchain network; (b) providing a second designated key pair comprising a second designated public key and a corresponding second designated private key, wherein the second designated private key also corresponds to a second designated public address associated with the underlying digital asset; and wherein the second designated private key is stored on a second computer system which is physically separated from the first computer system and is not operatively or physically connected to the blockchain network; (c) receiving, by an administrator system, a request to obtain a first sum of stable value digital asset tokens in exchange for a second sum of currency, wherein the first sum corresponds to the second sum based on a fixed ratio of stable value digital asset token to currency, and wherein the request comes from a first requesting user with an associated first requester key pair, comprising a first requester public key and a corresponding first requester private key, wherein the first requester private key also corresponds to a first requester public address associated with the underlying digital asset; (d) confirming, by the administrator system, receipt of the second sum of currency; (e) transferring the first sum of stable value digital asset tokens to the first requester public address using the following steps: (1) sending a second request, from the administrator system to the first computer system, to obtain the first sum of stable value digital asset tokens and transfer said first sum to the first requester public address; (2) generating, by the first computer system, first instructions addressed from the first designated public address to a first contract address including a message to obtain the first sum of stable value digital asset tokens and to assign the obtained first sum to the first requester public address, wherein the first contract address is associated with the underlying digital asset, wherein the first contract address is associated with first smart contract instructions for a stable value digital asset token, and wherein the first smart contract instructions are saved as part of the blockchain for the underlying digital asset and include: (A) token creation instructions including instructions to create tokens; (B) token transfer instructions including instructions to transfer tokens; (C) token destruction instructions including instructions to destroy tokens; (D) authorization instructions associated with the first designated key pair; and (E) authorization instructions associated with the second designated key pair; (3) digitally signing, by the first computer system, the first instructions using the first designated private key to generate first digitally signed instructions; (4) sending, from the first computer system to the plurality of geographically distributed computer systems, the first digitally signed instructions; wherein the first digitally signed instructions are executed by the plurality of geographically distributed computer systems in accordance with the first contract instructions; and (f) confirming, by the administrator system, that the first sum of stable value digital asset tokens has been obtained and transferred to the first requester public address based on reference to the blockchain.

In embodiments, the method further comprises the steps of: (g) receiving, by the administrator system, a third request to obtain a third sum of stable value digital asset tokens in exchange for a fourth sum of currency, wherein the third sum corresponds to the fourth sum based on the fixed ratio of stable value digital asset token to currency, wherein the third request comes from a second requesting user with an associated second requester key pair, comprising a second requester public key and a corresponding second requester private key, and wherein the second requester private key is associated with a second requester public address associated with the underlying digital asset; (h) confirming, by the administrator system, receipt of the fourth sum of currency; (i) transferring the third sum of stable value digital asset tokens to the second requester public address using the following steps: (1) generating, by the administrator system, second instructions from the second designated public address to the first contract address to obtain the third sum of stable value digital asset tokens and transfer said third sum to the second requester public address; (2) transferring, from the administrator system to a first portable memory device, the second instructions; (3) transferring, from the first portable memory device to the second computer, the second instructions; (4) digitally signing, by the second computer, the second instructions using the second designated private key to generate second digitally signed instructions; (5) transferring, from the second computer to a second portable memory device, the second digitally signed instructions; and (6) sending, from the second portable memory device to the plurality of geographically distributed computer systems, the second digitally signed instructions; and ( ) confirming, by the administrator system, that the third sum of stable value digital asset tokens have been obtained and transferred to the second requester public address based on reference to the blockchain.

In embodiments, the step of (i)(6) includes: (A) transferring, from the second portable memory device to the administrator system, the second digitally signed instructions; and (B) transferring, from the administrator system to the plurality of geographically distributed computer systems, the second digitally signed instructions.

In embodiments, the method further comprises the steps of: (k) providing a third designated key pair comprising a third designated public key and a corresponding third designated private key, wherein the third designated private key is stored on a third computer system which is physically separated from the first computer system and the second computer system and wherein the third computer system is not operatively connected or physically connected to the blockchain network; wherein the first smart contract instructions include: (F) authorization instructions associated with the third designated key pair; and wherein with respect to step (i), performing the following further steps: (7) determining that the first designated key pair does not have authority to obtain the third sum of stable value digital asset tokens; (8) determining, by the administrator system, the third designated key pair and the second designated key pair together have authority to obtain the third sum, and performing the following steps: (9) generating, by the administrator system, third instructions from the third designated public address to the first contract address to obtain the third sum of stable value digital asset tokens and transfer said third sum to the second requester public address; (10) transferring, from the administrator system to a third portable memory device, the third instructions; (11) transferring, from the third portable memory device to the third computer system, the third instructions; (12) digitally signing, by the third computer system, the third instructions using the third designated private key to generate third digitally signed instructions; (13) transferring, from the third computer system to a fourth portable memory device, the third digitally signed instructions; and (14) sending, from the fourth portable memory device to the plurality of geographically distributed computer systems, the third digitally signed instructions.

In embodiments, step (i)(14) includes the steps of: (A) transferring, from the fourth portable memory device to the administrator system, the third digitally signed instructions; and (B) transferring, from the administrator system to the plurality of geographically distributed computer systems, the third digitally signed instructions.

In embodiments, the third portable memory device and fourth portable memory device are the same portable memory device.

In embodiments, the third portable memory device and fourth portable memory device are different portable memory devices.

In embodiments, the method further includes the steps of: (k) providing a third designated key pair comprising a third designated public key and a corresponding third designated private key, wherein the third designated private key is stored on a third computer system which is physically separated from the first computer system and the second computer system and wherein the third computer system is not operatively connected or physically connected to the blockchain network; and wherein the first smart contract instructions further include: (F) authorization instructions associated with the third key pair; and wherein with respect to step (i), performing the following further steps: (7) determining the first designated key pair does not have authority to obtain the third sum; (8) determining the first designated key pair does not have authority to obtain the third sum; (9) determining, by the administrator system, that the third designated key pair, the second designated key pair and the first designated key pair together have authority to obtain the third sum; (10) sending a fifth request, from the administrator system to the first computer system, to obtain the third sum of stable value digital asset tokens and transfer said third sum to the second requester public address; (11) generating, by the administrator system, third instructions from the third designated public address to the first contract address to obtain the third sum of stable value digital asset tokens and transfer said third sum to the second requester public address; (12) transferring, from the administrator system to a third portable memory device, the third instructions; (13) transferring, from the third portable memory device to the third computer system, the third instructions; (14) digitally signing, by the third computer system, the third instructions using the third designated private key to generate third digitally signed instructions; (15) transferring, from the third computer system to a fourth portable memory device, the third digitally signed instructions; and (16) sending, from the fourth portable memory device to the plurality of geographically distributed computer systems, the third digitally signed instructions.

In embodiments, the step (i)(16) includes: (A) transferring, from the fourth portable memory device to the administrator system, the third digitally signed instructions; and (B) transferring, from the administrator system to the plurality of geographically distributed computer systems, the third digitally signed instructions.

In embodiments, the method further includes the steps of: (k) providing, by the administrator system a ledger including first account information associated with at least the first requesting user and second account information associated with at least the second requesting user, wherein the first account information includes first stable value digital asset token balance information and the second account information includes second stable value digital asset token balance information; (l) determining, by the administrator system, a total balance of the stable value digital asset tokens based on the sum of the first stable value digital asset token balance information and the second stable value digital asset token balance information; and (m) publishing, by the administrator system, the total balance of stable value digital asset tokens.

In embodiments, the method further includes the steps of: (k) generating, by a first requester computing device associated with the first requester, a transfer message to transfer stable value digital asset tokens to the second requester public address, the transfer message including: (1) a transfer number of stable value digital asset tokens; (2) the first requester public address; (3) the second requester public address; and (4) an electronic signature based on the first requester private key; (1) publishing, by the first requester computing device to the to the plurality of geographically distributed computer systems, the transfer message; and (m) confirming, by the first requester computing device, transfer of the number of stable value digital asset tokens from the first requester public address to the second requester public address by reference to the blockchain.

In embodiments, the first portable memory device and second portable memory device are the same portable memory device.

In embodiments, the first portable memory device and second portable memory device are different portable memory devices.

In embodiments, the fourth sum of currency is deposited in one or more bank accounts associated with the administrator.

In embodiments, the fourth sum of currency is used by the administrator to purchase one or more interest bearing financial instruments.

In embodiments, the authorization instructions associated with the first designated key pair include a limit on a number of tokens the first designated key pair is authorized to issue.

In embodiments, the authorization instructions associated with the first designated key pair include a time limit during which the first designated key pair is authorized to issue tokens.

In embodiments, the authorization instructions associated with the first designated key pair include a limit on a number of tokens the first designated key pair is authorized to issue over a period of time.

In embodiments, the currency is a fiat currency.

In embodiments, the fiat currency is U.S. dollar.

In embodiments, the fixed predetermined ratio is one stable value digital asset token is equal to one U.S. dollar.

In embodiments, the fixed predetermined ratio is one hundred stable value digital asset tokens is equal to one U.S. dollar.

In embodiments, the fiat currency is GB pound.

In embodiments, the fiat currency is SG dollar.

In embodiments, the fiat currency is EUR.

In embodiments, the fiat currency is HK dollar.

In embodiments, the fiat currency is Canadian dollar.

In embodiments, the fiat currency is Australian dollar.

In embodiments, the fiat currency is Yen.

In embodiments, the currency is a cryptocurrency.

In embodiments, the cryptocurrency is Bitcoin.

In embodiments, the cryptocurrency is Litecoin.

In embodiments, the cryptocurrency is Bitcoin Cash.

In embodiments, the cryptocurrency is Filecoin.

In embodiments, the cryptocurrency is Zcash.

In embodiments, the cryptocurrency is Stellar.

In embodiments, the cryptocurrency is Polkadot.

In embodiments, the cryptocurrency is Atom.

In embodiments, the cryptocurrency is Tezos.

In embodiments, the first designated public key is mathematically associated with the first designated private key.

In embodiments, the second designated public key is mathematically associated with the second designated private key.

In embodiments, the first contract instructions are based on the ERC720 standard.

In embodiments, the blockchain is the Ethereum blockchain.

In embodiments, the blockchain is the NEO blockchain.

In embodiments, the second sum of currency is deposited in one or more bank accounts associated with the administrator.

In embodiments, the second sum of currency is used by the administrator to purchase one or more interest bearing financial instruments.

In embodiments, the first request to obtain the first sum of stable value digital asset tokens specifies a requester fee payable to the administrator system in addition to the second sum of currency and step (d) includes confirming, by the administrator system, receipt of the second sum of currency and the requester fee.

In embodiments, the first request to obtain the first sum of stable value digital asset tokens specifies a miner fee payable to miners associated with the plurality of geographically distributed computer systems and step (d) includes confirming, by the administrator system, receipt of the second sum of currency and the miner fee.

In embodiments, a method of obtaining stable value digital asset tokens may comprise the steps of: (a) providing a first designated key pair comprising a first designated public key and a corresponding first designated private key, wherein the first designated private key also corresponds to a first designated public address associated with an underlying digital asset; wherein the underlying digital asset is maintained on a distributed public transaction ledger maintained in the form of a blockchain by a plurality of geographically distributed computer systems in a peer-to-peer network in the form of a blockchain network, and wherein the first designated private key is stored on a first computer system which is connected via the Internet to the blockchain network; (b) providing a second designated key pair comprising a second designated public key and a corresponding second designated private key, wherein the second designated private key also corresponds to a second designated public address associated with the underlying digital asset; and wherein the second designated private key is stored on a second computer system which is physically separated from the first computer system and is not operatively or physically connected to the blockchain network; (c) receiving, by a digital asset exchange system, a request to obtain a first sum of stable value digital asset tokens in exchange for a second sum of currency, wherein the first sum corresponds to the second sum based on a fixed ratio of stable value digital asset token to currency, and wherein the request comes from a first requesting user with an associated first requester key pair, comprising a first requester public key and a corresponding first requester private key, wherein the first requester private key also corresponds to a first requester public address associated with the underlying digital asset; (d) confirming, by the digital asset exchange system, receipt of the second sum of currency; (e) transferring the first sum of stable value digital asset tokens to the first requester public address using the following steps: (1) sending a second request, from the digital asset exchange system to the first computer system, to obtain the first sum of stable value digital asset tokens and transfer said first sum to the first requester public address; (2) generating, by the first computer system, first instructions addressed from the first designated public address to a first contract address including a message to obtain the first sum of stable value digital asset tokens and to assign the obtained first sum to the first requester public address, wherein the first contract address is associated with the underlying digital asset, wherein the first contract address is associated with first smart contract instructions for a stable value digital asset token, and wherein the first smart contract instructions are saved as part of the blockchain for the underlying digital asset and include: (A) token creation instructions including instructions to create tokens; (B) token transfer instructions including instructions to transfer tokens; (C) token destruction instructions including instructions to destroy tokens; (D) authorization instructions associated with the first designated key pair; and (E) authorization instructions associated with the second designated key pair; (3) digitally signing, by the first computer system, the first instructions using the first designated private key to generate first digitally signed instructions; (4) sending, from the first computer system to the plurality of geographically distributed computer systems, the first digitally signed instructions; wherein the first digitally signed instructions are executed by the plurality of geographically distributed computer systems in accordance with the first contract instructions; and (f) confirming, by the digital asset exchange system, that the first sum of stable value digital asset tokens has been obtained and transferred to the first requester public address based on reference to the blockchain.

In embodiments, the method further comprises the steps of: (g) receiving, by the digital asset exchange system, a third request to obtain a third sum of stable value digital asset tokens in exchange for a fourth sum of currency, wherein the third sum corresponds to the fourth sum based on the fixed ratio of stable value digital asset token to currency, wherein the third request comes from a second requesting user with an associated second requester key pair, comprising a second requester public key and a corresponding second requester private key, and wherein the second requester private key is associated with a second requester public address associated with the underlying digital asset; (h) confirming, by the digital asset exchange system, receipt of the fourth sum of currency; (i) transferring the third sum of stable value digital asset tokens to the second requester public address using the following steps: (1) generating, by the digital asset exchange system, second instructions from the second designated public address to the first contract address to obtain the third sum of stable value digital asset tokens and transfer said third sum to the second requester public address; (2) transferring, from the digital asset exchange system to a first portable memory device, the second instructions; (3) transferring, from the first portable memory device to the second computer, the second instructions; (4) digitally signing, by the second computer, the second instructions using the second designated private key to generate second digitally signed instructions; (5) transferring, from the second computer to a second portable memory device, the second digitally signed instructions; and (6) sending, from the second portable memory device to the plurality of geographically distributed computer systems, the second digitally signed instructions; and (j) confirming, by the digital asset exchange system, that the third sum of stable value digital asset tokens have been obtained and transferred to the second requester public address based on reference to the blockchain.

In embodiments, the step of (i)(6) includes: (A) transferring, from the second portable memory device to the digital asset exchange system, the second digitally signed instructions; and (B) transferring, from the digital asset exchange system to the plurality of geographically distributed computer systems, the second digitally signed instructions.

In embodiments, the method further comprises the steps of: (k) providing a third designated key pair comprising a third designated public key and a corresponding third designated private key, wherein the third designated private key is stored on a third computer system which is physically separated from the first computer system and the second computer system and wherein the third computer system is not operatively connected or physically connected to the blockchain network; wherein the first smart contract instructions include: (F) authorization instructions associated with the third designated key pair; and wherein with respect to step (i), performing the following further steps: (7) determining that the first designated key pair does not have authority to obtain the third sum of stable value digital asset tokens; (8) determining, by the digital asset exchange system, the third designated key pair and the second designated key pair together have authority to obtain the third sum, and performing the following steps: (9) generating, by the digital asset exchange system, third instructions from the third designated public address to the first contract address to obtain the third sum of stable value digital asset tokens and transfer said third sum to the second requester public address; (10) transferring, from the digital asset exchange system to a third portable memory device, the third instructions; (11) transferring, from the third portable memory device to the third computer system, the third instructions; (12) digitally signing, by the third computer system, the third instructions using the third designated private key to generate third digitally signed instructions; (13) transferring, from the third computer system to a fourth portable memory device, the third digitally signed instructions; and (14) sending, from the fourth portable memory device to the plurality of geographically distributed computer systems, the third digitally signed instructions.

In embodiments, step (i)(14) includes the steps of: (A) transferring, from the fourth portable memory device to the digital asset exchange system, the third digitally signed instructions; and (B) transferring, from the digital asset exchange system to the plurality of geographically distributed computer systems, the third digitally signed instructions.

In embodiments, the third portable memory device and fourth portable memory device are the same portable memory device.

In embodiments, the third portable memory device and fourth portable memory device are different portable memory devices.

In embodiments, the method further includes the steps of: (k) providing a third designated key pair comprising a third designated public key and a corresponding third designated private key, wherein the third designated private key is stored on a third computer system which is physically separated from the first computer system and the second computer system and wherein the third computer system is not operatively connected or physically connected to the blockchain network; and wherein the first smart contract instructions further include: (F) authorization instructions associated with the third key pair; and wherein with respect to step (i), performing the following further steps: (7) determining the first designated key pair does not have authority to obtain the third sum; (8) determining the first designated key pair does not have authority to obtain the third sum; (9) determining, by the digital asset exchange system, that the third designated key pair, the second designated key pair and the first designated key pair together have authority to obtain the third sum; (10) sending a fifth request, from the digital asset exchange system to the first computer system, to obtain the third sum of stable value digital asset tokens and transfer said third sum to the second requester public address; (11) generating, by the digital asset exchange system, third instructions from the third designated public address to the first contract address to obtain the third sum of stable value digital asset tokens and transfer said third sum to the second requester public address; (12) transferring, from the digital asset exchange system to a third portable memory device, the third instructions; (13) transferring, from the third portable memory device to the third computer system, the third instructions; (14) digitally signing, by the third computer system, the third instructions using the third designated private key to generate third digitally signed instructions; (15) transferring, from the third computer system to a fourth portable memory device, the third digitally signed instructions; and (16) sending, from the fourth portable memory device to the plurality of geographically distributed computer systems, the third digitally signed instructions.

In embodiments, the step (i)(16) includes: (A) transferring, from the fourth portable memory device to the digital asset exchange system, the third digitally signed instructions; and (B) transferring, from the digital asset exchange system to the plurality of geographically distributed computer systems, the third digitally signed instructions.

In embodiments, the method further includes the steps of: (k) providing, by the digital asset exchange system a ledger including first account information associated with at least the first requesting user and second account information associated with at least the second requesting user, wherein the first account information includes first stable value digital asset token balance information and the second account information includes second stable value digital asset token balance information; (l) determining, by the digital asset exchange system, a total balance of the stable value digital asset tokens based on the sum of the first stable value digital asset token balance information and the second stable value digital asset token balance information; and (m) publishing, by the digital asset exchange system, the total balance of stable value digital asset tokens.

In embodiments, the method further includes the steps of: (k) generating, by a first requester computing device associated with the first requester, a transfer message to transfer stable value digital asset tokens to the second requester public address, the transfer message including: (1) a transfer number of stable value digital asset tokens; (2) the first requester public address; (3) the second requester public address; and (4) an electronic signature based on the first requester private key; (l) publishing, by the first requester computing device to the to the plurality of geographically distributed computer systems, the transfer message; and (m) confirming, by the first requester computing device, transfer of the number of stable value digital asset tokens from the first requester public address to the second requester public address by reference to the blockchain.

In embodiments, the first portable memory device and second portable memory device are the same portable memory device.

In embodiments, the first portable memory device and second portable memory device are different portable memory devices.

In embodiments, the fourth sum of currency is deposited in one or more bank accounts associated with the digital asset exchange.

In embodiments, the fourth sum of currency is used by the digital asset exchange to purchase one or more interest bearing financial instruments.

In embodiments, the authorization instructions associated with the first designated key pair include a limit on a number of tokens the first designated key pair is authorized to issue.

In embodiments, the authorization instructions associated with the first designated key pair include a time limit during which the first designated key pair is authorized to issue tokens.

In embodiments, the authorization instructions associated with the first designated key pair include a limit on a number of tokens the first designated key pair is authorized to issue over a period of time.

In embodiments, the currency is a fiat currency.

In embodiments, the fiat currency is U.S. dollar.

In embodiments, the fixed predetermined ratio is one stable value digital asset token is equal to one U.S. dollar.

In embodiments, the fixed predetermined ratio is one hundred stable value digital asset tokens is equal to one U.S. dollar.

In embodiments, the fiat currency is GB pound.

In embodiments, the fiat currency is SG dollar.

In embodiments, the fiat currency is EUR.

In embodiments, the fiat currency is HK dollar.

In embodiments, the fiat currency is Canadian dollar.

In embodiments, the fiat currency is Australian dollar.

In embodiments, the fiat currency is Yen.

In embodiments, the currency is a cryptocurrency.

In embodiments, the cryptocurrency is Bitcoin.

In embodiments, the cryptocurrency is Litecoin.

In embodiments, the cryptocurrency is Bitcoin Cash.

In embodiments, the cryptocurrency is Filecoin.

In embodiments, the cryptocurrency is Zcash.

In embodiments, the cryptocurrency is Stellar.

In embodiments, the cryptocurrency is Polkadot.

In embodiments, the cryptocurrency is Atom.

In embodiments, the cryptocurrency is Tezos.

In embodiments, the first designated public key is mathematically associated with the first designated private key.

In embodiments, the second designated public key is mathematically associated with the second designated private key.

In embodiments, the first contract instructions are based on the ERC720 standard.

In embodiments, the blockchain is the Ethereum blockchain.

In embodiments, the blockchain is the NEO blockchain.

In embodiments, the second sum of currency is deposited in one or more bank accounts associated with the digital asset exchange.

In embodiments, the second sum of currency is used by the digital asset exchange to purchase one or more interest bearing financial instruments.

In embodiments, the first request to obtain the first sum of stable value digital asset tokens specifies a requester fee payable to the digital asset exchange system in addition to the second sum of currency and step (d) includes confirming, by the digital asset exchange system, receipt of the second sum of currency and the requester fee.

In embodiments, the first request to obtain the first sum of stable value digital asset tokens specifies a miner fee payable to miners associated with the plurality of geographically distributed computer systems and step (d) includes confirming, by the digital asset exchange system, receipt of the second sum of currency and the miner fee.

In embodiments, a method of obtaining stable value digital asset tokens may comprise the steps of: (a) providing a first designated key pair comprising a first designated public key and a corresponding first designated private key, wherein the first designated private key also corresponds to a first designated public address associated with an underlying digital asset; wherein the underlying digital asset is maintained on a distributed public transaction ledger maintained in the form of a blockchain by a plurality of geographically distributed computer systems in a peer-to-peer network in the form of a blockchain network, and wherein the first designated private key is stored on a first computer system which is connected via the Internet to the blockchain network; (b) providing a second designated key pair comprising a second designated public key and a corresponding second designated private key, wherein the second designated private key also corresponds to a second designated public address associated with the underlying digital asset; and wherein the second designated private key is stored on a second computer system which is physically separated from the first computer system and is not operatively or physically connected to the blockchain network; (c) receiving, by a digital asset token issuer system, a request to obtain a first sum of stable value digital asset tokens in exchange for a second sum of currency, wherein the first sum corresponds to the second sum based on a fixed ratio of stable value digital asset token to currency, and wherein the request comes from a first requesting user with an associated first requester key pair, comprising a first requester public key and a corresponding first requester private key, wherein the first requester private key also corresponds to a first requester public address associated with the underlying digital asset; (d) confirming, by the digital asset token issuer system, receipt of the second sum of currency; (e) transferring the first sum of stable value digital asset tokens to the first requester public address using the following steps: (1) sending a second request, from the digital asset token issuer system to the first computer system, to obtain the first sum of stable value digital asset tokens and transfer said first sum to the first requester public address; (2) generating, by the first computer system, first instructions addressed from the first designated public address to a first contract address including a message to obtain the first sum of stable value digital asset tokens and to assign the obtained first sum to the first requester public address, wherein the first contract address is associated with the underlying digital asset, wherein the first contract address is associated with first smart contract instructions for a stable value digital asset token, and wherein the first smart contract instructions are saved as part of the blockchain for the underlying digital asset and include: (A) token creation instructions including instructions to create tokens; (B) token transfer instructions including instructions to transfer tokens; (C) token destruction instructions including instructions to destroy tokens; (D) authorization instructions associated with the first designated key pair; and (E) authorization instructions associated with the second designated key pair; (3) digitally signing, by the first computer system, the first instructions using the first designated private key to generate first digitally signed instructions; (4) sending, from the first computer system to the plurality of geographically distributed computer systems, the first digitally signed instructions; wherein the first digitally signed instructions are executed by the plurality of geographically distributed computer systems in accordance with the first contract instructions; and (f) confirming, by the digital asset token issuer system, that the first sum of stable value digital asset tokens has been obtained and transferred to the first requester public address based on reference to the blockchain.

In embodiments, the method further comprises the steps of: (g) receiving, by the digital asset token issuer system, a third request to obtain a third sum of stable value digital asset tokens in exchange for a fourth sum of currency, wherein the third sum corresponds to the fourth sum based on the fixed ratio of stable value digital asset token to currency, wherein the third request comes from a second requesting user with an associated second requester key pair, comprising a second requester public key and a corresponding second requester private key, and wherein the second requester private key is associated with a second requester public address associated with the underlying digital asset; (h) confirming, by the digital asset token issuer system, receipt of the fourth sum of currency; (i) transferring the third sum of stable value digital asset tokens to the second requester public address using the following steps: (1) generating, by the digital asset token issuer system, second instructions from the second designated public address to the first contract address to obtain the third sum of stable value digital asset tokens and transfer said third sum to the second requester public address; (2) transferring, from the digital asset token issuer system to a first portable memory device, the second instructions; (3) transferring, from the first portable memory device to the second computer, the second instructions; (4) digitally signing, by the second computer, the second instructions using the second designated private key to generate second digitally signed instructions; (5) transferring, from the second computer to a second portable memory device, the second digitally signed instructions; and (6) sending, from the second portable memory device to the plurality of geographically distributed computer systems, the second digitally signed instructions; and (j) confirming, by the digital asset token issuer system, that the third sum of stable value digital asset tokens have been obtained and transferred to the second requester public address based on reference to the blockchain.

In embodiments, the step of (i)(6) includes: (A) transferring, from the second portable memory device to the digital asset token issuer system, the second digitally signed instructions; and (B) transferring, from the digital asset token issuer system to the plurality of geographically distributed computer systems, the second digitally signed instructions.

In embodiments, the method further comprises the steps of: (k) providing a third designated key pair comprising a third designated public key and a corresponding third designated private key, wherein the third designated private key is stored on a third computer system which is physically separated from the first computer system and the second computer system and wherein the third computer system is not operatively connected or physically connected to the blockchain network; wherein the first smart contract instructions include: (F) authorization instructions associated with the third designated key pair; and wherein with respect to step (i), performing the following further steps: (7) determining that the first designated key pair does not have authority to obtain the third sum of stable value digital asset tokens; (8) determining, by the digital asset token issuer system, the third designated key pair and the second designated key pair together have authority to obtain the third sum, and performing the following steps: (9) generating, by the digital asset token issuer system, third instructions from the third designated public address to the first contract address to obtain the third sum of stable value digital asset tokens and transfer said third sum to the second requester public address; (10) transferring, from the digital asset token issuer system to a third portable memory device, the third instructions; (11) transferring, from the third portable memory device to the third computer system, the third instructions; (12) digitally signing, by the third computer system, the third instructions using the third designated private key to generate third digitally signed instructions; (13) transferring, from the third computer system to a fourth portable memory device, the third digitally signed instructions; and (14) sending, from the fourth portable memory device to the plurality of geographically distributed computer systems, the third digitally signed instructions.

In embodiments, step (i)(14) includes the steps of: (A) transferring, from the fourth portable memory device to the digital asset token issuer system, the third digitally signed instructions; and (B) transferring, from the digital asset token issuer system to the plurality of geographically distributed computer systems, the third digitally signed instructions.

In embodiments, the third portable memory device and fourth portable memory device are the same portable memory device.

In embodiments, the third portable memory device and fourth portable memory device are different portable memory devices.

In embodiments, the method further includes the steps of: (k) providing a third designated key pair comprising a third designated public key and a corresponding third designated private key, wherein the third designated private key is stored on a third computer system which is physically separated from the first computer system and the second computer system and wherein the third computer system is not operatively connected or physically connected to the blockchain network; and wherein the first smart contract instructions further include: (F) authorization instructions associated with the third key pair; and wherein with respect to step (i), performing the following further steps: (7) determining the first designated key pair does not have authority to obtain the third sum; (8) determining the first designated key pair does not have authority to obtain the third sum; (9) determining, by the digital asset token issuer system, that the third designated key pair, the second designated key pair and the first designated key pair together have authority to obtain the third sum; (10) sending a fifth request, from the digital asset token issuer system to the first computer system, to obtain the third sum of stable value digital asset tokens and transfer said third sum to the second requester public address; (11) generating, by the digital asset token issuer system, third instructions from the third designated public address to the first contract address to obtain the third sum of stable value digital asset tokens and transfer said third sum to the second requester public address; (12) transferring, from the digital asset token issuer system to a third portable memory device, the third instructions; (13) transferring, from the third portable memory device to the third computer system, the third instructions; (14) digitally signing, by the third computer system, the third instructions using the third designated private key to generate third digitally signed instructions; (15) transferring, from the third computer system to a fourth portable memory device, the third digitally signed instructions; and (16) sending, from the fourth portable memory device to the plurality of geographically distributed computer systems, the third digitally signed instructions.

In embodiments, the step (i)(16) includes: (A) transferring, from the fourth portable memory device to the digital asset token issuer system, the third digitally signed instructions; and (B) transferring, from the digital asset token issuer system to the plurality of geographically distributed computer systems, the third digitally signed instructions.

In embodiments, the method further includes the steps of: (k) providing, by the digital asset token issuer system a ledger including first account information associated with at least the first requesting user and second account information associated with at least the second requesting user, wherein the first account information includes first stable value digital asset token balance information and the second account information includes second stable value digital asset token balance information; (l) determining, by the digital asset token issuer system, a total balance of the stable value digital asset tokens based on the sum of the first stable value digital asset token balance information and 1 the second stable value digital asset token balance information; and (m) publishing, by the digital asset token issuer system, the total balance of stable value digital asset tokens.

In embodiments, the method further includes the steps of: (k) generating, by a first requester computing device associated with the first requester, a transfer message to transfer stable value digital asset tokens to the second requester public address, the transfer message including: (1) a transfer number of stable value digital asset tokens; (2) the first requester public address; (3) the second requester public address; and (4) an electronic signature based on the first requester private key; (l) publishing, by the first requester computing device to the to the plurality of geographically distributed computer systems, the transfer message; and (m) confirming, by the first requester computing device, transfer of the number of stable value digital asset tokens from the first requester public address to the second requester public address by reference to the blockchain.

In embodiments, the first portable memory device and second portable memory device are the same portable memory device.

In embodiments, the first portable memory device and second portable memory device are different portable memory devices.

In embodiments, the fourth sum of currency is deposited in one or more bank accounts associated with the digital asset token issuer.

In embodiments, the fourth sum of currency is used by the digital asset token issuer to purchase one or more interest bearing financial instruments.

In embodiments, the authorization instructions associated with the first designated key pair include a limit on a number of tokens the first designated key pair is authorized to issue.

In embodiments, the authorization instructions associated with the first designated key pair include a time limit during which the first designated key pair is authorized to issue tokens.

In embodiments, the authorization instructions associated with the first designated key pair include a limit on a number of tokens the first designated key pair is authorized to issue over a period of time.

In embodiments, the currency is a fiat currency.

In embodiments, the fiat currency is U.S. dollar.

In embodiments, the fixed predetermined ratio is one stable value digital asset token is equal to one U.S. dollar.

In embodiments, the fixed predetermined ratio is one hundred stable value digital asset tokens is equal to one U.S. dollar.

In embodiments, the fiat currency is GB pound.

In embodiments, the fiat currency is SG dollar.

In embodiments, the fiat currency is EUR.

In embodiments, the flat currency is HK dollar.

In embodiments, the fiat currency is Canadian dollar.

In embodiments, the fiat currency is Australian dollar.

In embodiments, the fiat currency is Yen.

In embodiments, the currency is a cryptocurrency.

In embodiments, the cryptocurrency is Bitcoin.

In embodiments, the cryptocurrency is Litecoin.

In embodiments, the cryptocurrency is Bitcoin Cash.

In embodiments, the cryptocurrency is Filecoin.

In embodiments, the cryptocurrency is Zcash.

In embodiments, the cryptocurrency is Stellar.

In embodiments, the cryptocurrency is Polkadot.

In embodiments, the cryptocurrency is Atom.

In embodiments, the cryptocurrency is Tezos.

In embodiments, the first designated public key is mathematically associated with the first designated private key.

In embodiments, the second designated public key is mathematically associated with the second designated private key.

In embodiments, the first contract instructions are based on the ERC720 standard.

In embodiments, the blockchain is the Ethereum blockchain.

In embodiments, the blockchain is the NEO blockchain.

In embodiments, the second sum of currency is deposited in one or more bank accounts associated with the digital asset token issuer.

In embodiments, the second sum of currency is used by the digital asset token issuer to purchase one or more interest bearing financial instruments.

In embodiments, the first request to obtain the first sum of stable value digital asset tokens specifies a requester fee payable to the digital asset token issuer system in addition to the second sum of currency and step (d) includes confirming, by the digital asset token issuer system, receipt of the second sum of currency and the requester fee.

In embodiments, the first request to obtain the first sum of stable value digital asset tokens specifies a miner fee payable to miners associated with the plurality of geographically distributed computer systems and step (d) includes confirming, by the digital asset token issuer system, receipt of the second sum of currency and the miner fee.

FIG. 15B illustrates an exemplary GUI for an interface with the digital asset exchange in which a user can withdraw/purchase stable value tokens in the form of Gemini Dollar tokens from their digital asset exchange account. In this exemplary embodiment, the amount of the withdrawal is expressed in U.S. Dollars, and a corresponding amount of U.S. Dollars is debited from the user's fiat account with the exchange. As part of the withdrawal process, the digital asset exchange may arrange to issue new stable value tokens to the customer at the specified digital asset exchange in accordance with embodiments elsewhere described. In embodiments, the digital asset exchange may instead transfer pre-existing stable value tokens instead. As noted above, since the stable value token is pegged to a predetermined ratio of fiat, (e.g., 1 Gemini Dollar=USD 1, or 100 Gemini Dollar=USD 1), expressing the withdrawal amount in dollars is sufficient to allow the user and the digital asset system to determine the amount of Gemini Dollars tokens being withdrawn/purchased.

Figure 16A:
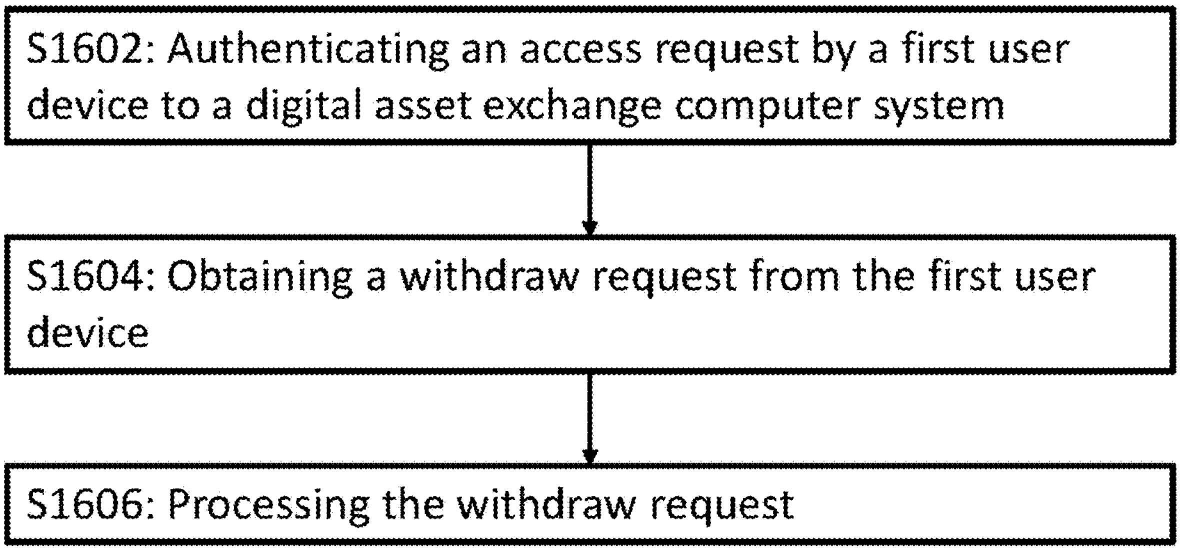
FIG. 16A is an exemplary flowchart of a process for withdrawing stable value digital asset tokens from a digital asset exchange computer system in accordance with exemplary embodiments in the present invention.
Figure 16B:
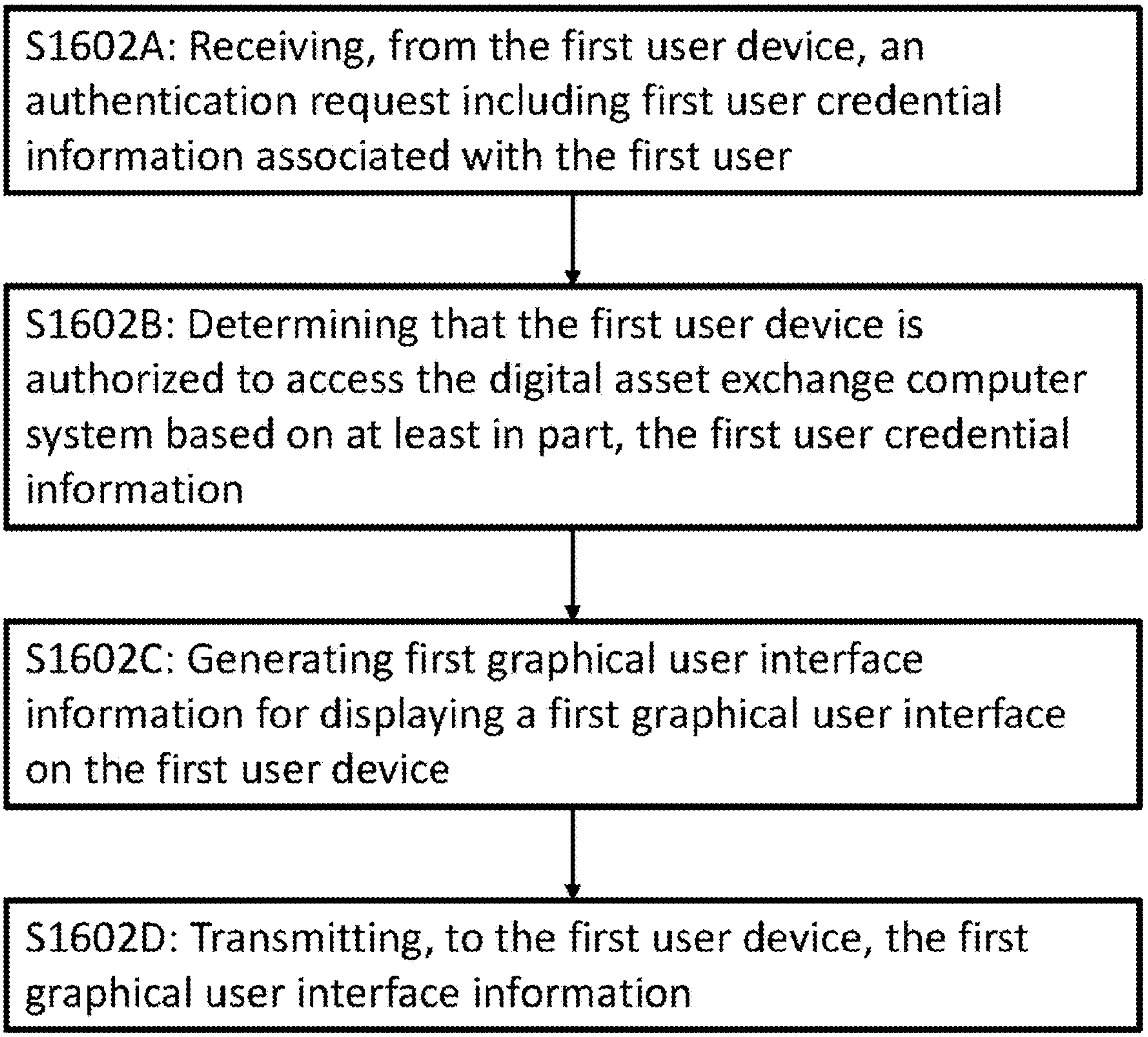
FIG. 16B is an exemplary flowchart of a process for authenticating an access request by a user device in accordance with exemplary embodiments in the present invention.

FIGS. 16A-16E illustrate an embodiment of withdrawing/purchasing stable value digital asset tokens (i.e., Gemini Dollar tokens) in exchange for currency (e.g., an asset which may include fiat and/or cryptocurrency, fiat, digital asset, a basket of fiat and/or digital asset, and/or a combination thereof, to name a few). For example, a first user may want to purchase stable value digital asset tokens in exchange for fiat. As another example, the first user may want to withdraw stable value digital asset tokens in exchange for a second digital asset. In embodiments, the user wants to obtain stable value digital asset in exchange for one or more of: fiat, digital asset, a basket of fiat and/or digital asset, and/or a combination thereof, to name a few. Referring to FIG. 16A, the process for withdrawing/purchasing stable value digital asset tokens may begin with step S1602. At step S1602, in embodiments, a digital asset exchange computer system associated with a digital asset exchange may receive and/or authenticate and an access request from a first user device associated with a first user. FIG. 16B provides a more detailed illustration of an exemplary embodiment of receiving and authenticating an access request from a first user device associated with a first user that may be used in accordance with exemplary embodiments of step 1602. Referring to FIG. 16B, at step S1602A, in embodiments, the digital asset exchange computer system receives an authentication request from the first user device. In embodiments, the authentication request includes first user credential information associated with the first user.

The authentication process, in embodiments, may continue with step S1602B. At step S1602B, in embodiments, the digital asset exchange computer system determines that the first user device is authorized to access the digital asset exchange computer system based at least on the first user credential information. In embodiments, the digital asset exchange computer system may further determine that the first user is a registered user of the digital asset exchange. In embodiments, the digital asset exchange may be licensed by a government regulatory authority.

The authentication process, in embodiments, may continue with step S1602C. At step S1602C, in embodiments, the digital asset exchange computer system generates first graphical user interface (GUI) information for displaying a first graphical user interface on the first user device. At step S1602D, in embodiments, the digital asset exchange computer system transmits the first graphical user interface information to the first user device.

As described in connection with FIGS. 16A-16E, each message sent and/or received in embodiments, may be encrypted communication. The communication may be encrypted by the sender and/or receiver of the message, in embodiments. Similarly, each message may be sent and/or received via a secure channel, such as an encrypted communication. For example, each message may be using an asymmetric key, such as a PKI key, or using a symmetric key, such as used in TLS, to name a few. Each message, in embodiments, may be encrypted by a sender and/or receiver of the message (e.g., first user device and/or digital asset exchange computer system). Similarly, each transaction request, in embodiments, may be digitally signed by the digital asset exchange computer system (e.g., using a private key associated with the digital asset exchange computer system system) and/or digitally signed by the digital asset exchange computer system and the first user device (e.g., via MPC). In embodiments, each instruction included within each transaction request may be encrypted and/or digitally signed using one or more private keys associated with the digital asset exchange computer system (and/or the First user device(s)). In embodiments, such a request and/or message may be via a secure channel, such as an encrypted communication. For example, the communication may be using an asymmetric key, such as a PKI key, or using a symmetric key, such as used in TLS, to name a few. The communication, in embodiments, may be encrypted by a first user device and/or an administrator (e.g., the digital asset exchange computer system 6102).

Figure 16C:
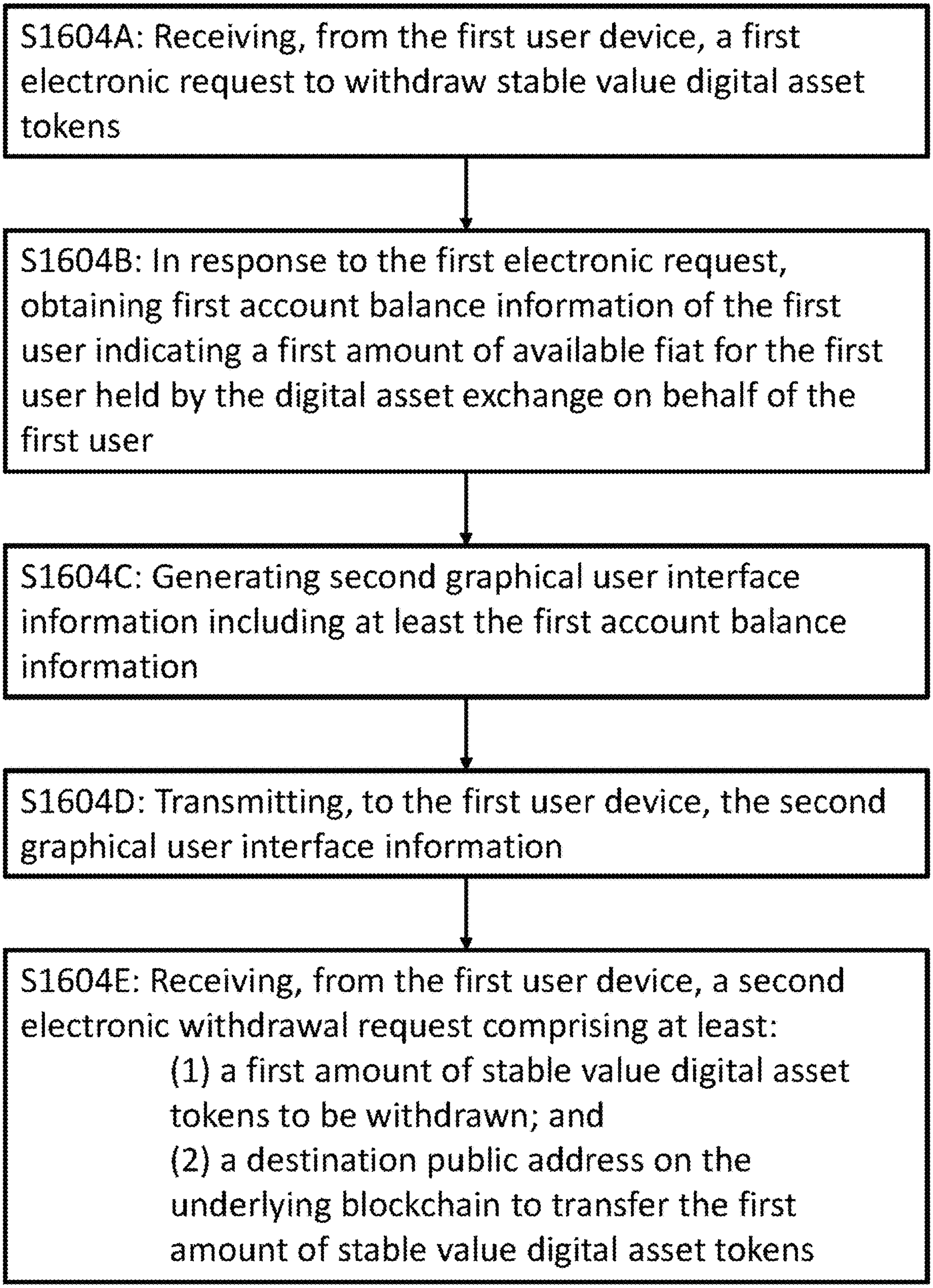
Figures 1, 16C:
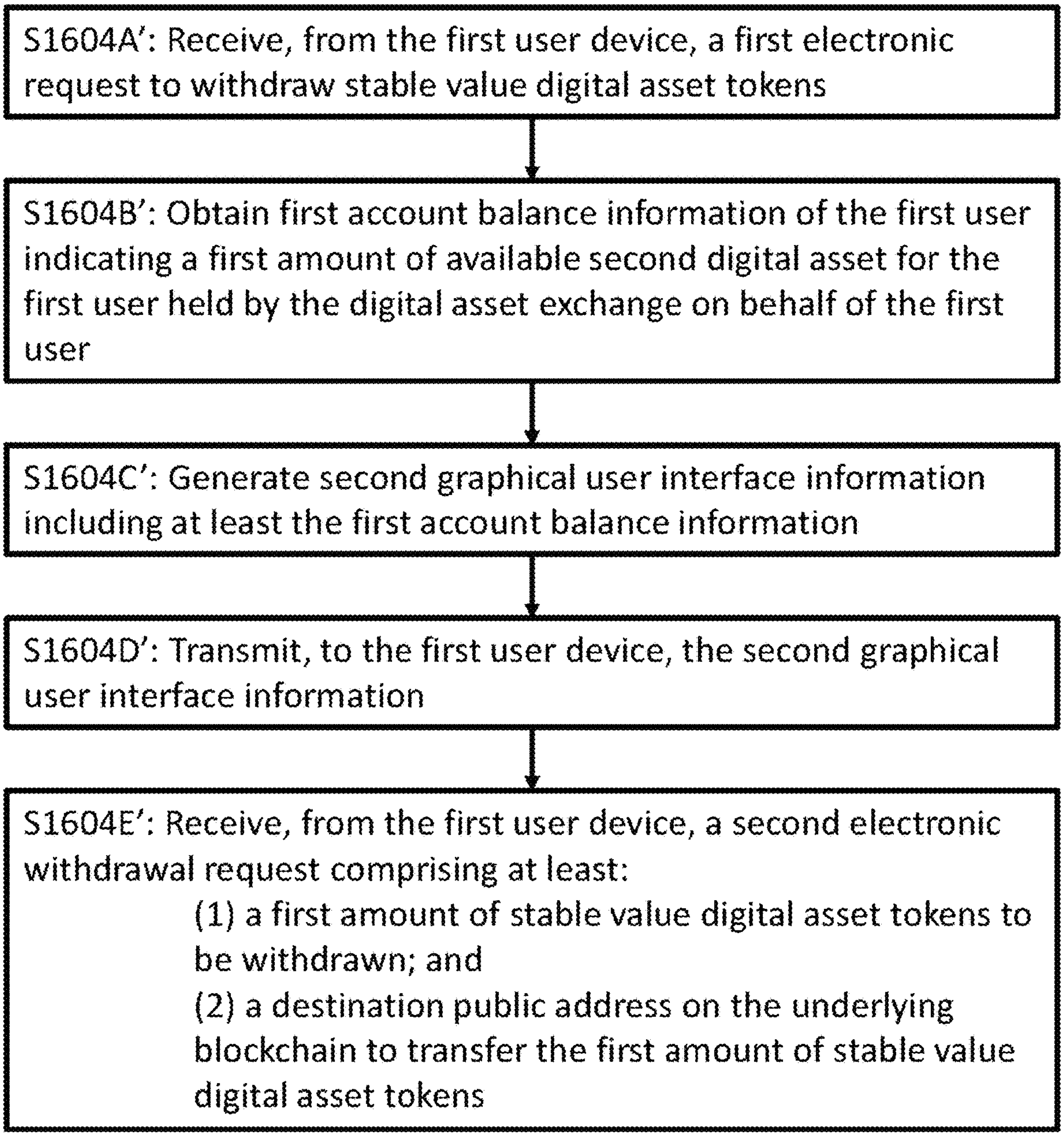

Referring back to FIG. 16A, the process for purchasing and/or withdrawing a stable value digital asset token may continue with step S1604. At step S1604, in embodiments, the digital asset computer system may obtain a withdraw request from the first user device. FIG. 16C provides a detailed illustration of an exemplary process of obtaining the withdraw request that may be used in accordance with exemplary embodiments of step 1604. Referring to FIG. 16C, in embodiments, at step S1604A, the digital asset exchange computer system receives a first electronic request to withdraw stable value digital asset tokens from the first user device. In embodiments, the stable value digital asset token is tied to an underlying digital asset which is maintained on a distributed public transaction ledger in the form of a blockchain maintained by a plurality of geographically distributed computer systems in a peer-to-peer network in the form of the blockchain network. In embodiments, the underlying digital asset is ETHER and the blockchain is the ETHEREUM Blockchain. In embodiments, the underlying digital asset is NEO and the blockchain is the NEO Blockchain.

In embodiments, the received request to purchase/withdraw stable value digital asset tokens (e.g., in connection with FIG. 16A and/or FIG. 16C) may be verified by the digital asset exchange computer system. In embodiments, the digital asset exchange computer system may verify the request by determining whether the user has sufficient funds (e.g., fiat, digital asset, asset, combination thereof, to name a few) to complete the transaction. The determination of whether the first user has sufficient funds to complete the transaction, in embodiments, may be based on reference to an electronic ledger associated with the digital asset exchange computer system (e.g., transaction ledger 115). Sufficient funds, in embodiments, may account any associated fees with the transaction. For example, the request for the generation of 10 stable value digital asset tokens may require a deposit of 11 second digital assets (and/or 11 USD)—10 second digital assets (and/or 10 USD) for issuing the first sum of stable value digital asset token and 1 second digital asset (and/or 1 USD) for one or more fee(s) associated with the issuance of stable value digital asset tokens. If the received request is not verified, in embodiments, the digital asset exchange computer system may generate and send a notification indicating the received request was denied which may include information indicating one or more reasons the received request was denied (e.g., insufficient funds, the requester is not authorized to complete the transaction, to name a few). In embodiments, the request may be verified.

In embodiments, the digital asset exchange computer system may generate a first message including instructions to transfer a sum of the second digital asset (and/or asset, and/or fiat) into a designated public address associated with the digital asset exchange computer system. The first message, in embodiments, may include machine-executable instructions which, when executed, display information on the first user device that indicates instructions to transfer the sum of the second digital asset to the designated public address. In embodiments, continuing the above example, the digital asset exchange computer system may generate an electronic response to the requester's electronic request. The electronic response, in embodiments, may include instructions on how to transfer the sum of second digital asset. For example, the electronic response may include information sufficient to indicate that the requester is to deposit the sum of second digital asset into the designated public address, which may be, in embodiments, represented by one or more of an alpha-numeric public address, and/or a QR code representation of the alpha-numeric public address, to name a few. In embodiments, such a message may be sent via a secure channel, such as an encrypted communication. For example, the message may be encrypted using an asymmetric key, such as a PKI key, and/or using a symmetric key, such as used in TLS, to name a few. The message, in embodiments, may be encrypted by the sender (e.g., the digital asset exchange computer system) and/or the recipient (e.g., the user device), to name a few. In embodiments, the message may be sent by the digital asset exchange computer system to the first user device. In embodiments, such a message may be made via a secure channel, such as an encrypted communication. For example, the message may be encrypted using an asymmetric key, such as a PKI key, or using a symmetric key, such as used in TLS, to name a few. The communication, in embodiments, may be encrypted by the sender (e.g., the digital asset token issuer system) and/or the recipient (e.g., the requester device), to name a few.

In embodiments, the digital asset exchange computer system may confirm receipt of the second digital asset (e.g., at a designated address on a first blockchain). The confirmation, in embodiments, may be based on reference to a distributed transaction ledger (e.g., a blockchain). In embodiments, the digital asset exchange computer system may confirm that the designated public address has received the sum of second digital asset. The confirmation process may be a call/return to/from the designated public address. In embodiments, the confirmation process may be a query to the peer-to-peer network for a status of the distributed transaction ledger, which may result in a receipt of the status of the distributed transaction ledger which may include the transfer of the amount of second digital assets.

The process of obtaining a withdraw and/or purchase request may continue with step S1604B. At step S1604B, the digital asset exchange computer system may obtain first account balance information of the first user indicating a first amount of available fiat for the first user held by the digital asset exchange on behalf of the user. The digital asset exchange computer system may obtain the first account balance from a fiat account ledger database stored on computer readable member accessible by the digital asset exchange computer system. In embodiments, as illustrated in connection with FIG. 16C-1, the digital asset exchange computer system, at step S1604B', may obtain first account information, which may indicate a first amount of available second digital asset held by the digital asset exchange on behalf of the user (e.g., at a public address associated with the first user on the blockchain). The first account information, in embodiments, may be obtained based on reference to a distributed transaction ledger (e.g., a blockchain). The determination of an account balance may be a call/return to/from the designated public address. In embodiments, the confirmation process may be a query to the peer-to-peer network for a status of the distributed transaction ledger, which may result in a receipt of the status of the distributed transaction ledger which may include the transfer of the amount of second digital assets. In embodiments (not shown), the digital asset exchange computer system may obtain first account information which may indicate a first amount of available asset.

The process of obtaining a withdraw and/or purchase request may continue with step S1604C. At step S1604C, in embodiments, the digital asset exchange computer system generates second graphical user interface information including at least the first account balance information. In embodiments, the second graphical user interface may be similar to the graphical user interface shown in connection with FIG. 15B. At step S1604D, in embodiments, the digital asset exchange computer system transmits the second graphical user interface information to the first user device. In embodiments, the first user device may display the second graphical user interface in response to this transmission. For example, the first user device may display the graphical user interface shown in connection with FIG. 15B.

The process of obtaining a withdraw and/or purchase request may continue with step S1604E. At step S1604E, in embodiments, the digital asset exchange computer system may receive a second electronic withdrawal request from the first user device. The second electronic withdrawal/purchase request may include at least: (1) a first amount of stable value digital asset tokens to be withdrawn; and (2) a destination public address on the underlying blockchain to transfer the first amount of stable value digital asset tokens. The second electronic request may include information indicating the source of the fiat, asset, and/or second digital asset being used to withdraw/purchase the stable value digital asset tokens.

Referring back to FIG. 16A, in step S1606, the digital asset exchange computer system processes the second withdrawal request. FIGS. 16D, 16E, 16F, and 16G provide a detailed illustration of an exemplary process of processing the second withdrawal request. Step S1606, referring to FIG. 16D, may begin with step S1606A. At step S1606A, in embodiments, the digital asset exchange computer system may calculate a second amount of fiat based on the first amount of stable value digital asset tokens. The second amount of fiat may be determined using a fixed predetermined ratio of stable value digital asset tokens to fiat. In embodiments, the fiat is U.S. Dollars. In the embodiments where the fiat is U.S. Dollars, the fixed predetermined ratio may be one stable value digital asset token is equal to one U.S. Dollar. In embodiments, the ratio may be one hundred stable value digital asset tokes is equal to one U.S. Dollar.

At step S1606B, the digital asset exchange computer system determines that the second amount of fiat is less than the first amount of available fiat of the first user. In step 1606C, where the second amount of fiat is less than the first amount of available fiat of the first user, the digital asset exchange computer system determines a third amount of fiat associated with an updated amount of available fiat of the first user. In embodiments, the third amount of fiat equals the first amount of available fiat of the first user less the second amount of fiat.

At step S1606D, the digital asset exchange computer system updates the flat ledger database to reflect the updated amount of available fiat. In step S1606E, the digital asset exchange computer system updates a stable value digital asset token issuer fiat ledger, increasing the balance of fiat by the second amount of fiat. In embodiments, the digital asset exchange computer system may transfer the second amount of fiat from a digital asset exchange fiat account to a stable value digital asset token issuer fiat account. In embodiments, the digital asset exchange computer system may periodically transfer fiat between the digital asset exchange fiat account and the stable value digital asset token issuer fiat account.

As described above, the digital asset exchange may process a withdrawal/purchase request for stable value digital asset tokens in exchange for a second digital asset. A detailed explanation of processing a withdrawal/purchase request for stable value digital asset tokens in exchange for a second digital asset is illustrated with respect to FIG. 16F. Referring to 16F, in embodiments, step S1606 may begin with step S1606A'. At step S1606A', in embodiments, the digital asset exchange computer system may calculate a second amount of second digital asset based on the first amount of stable value digital asset tokens. The second amount of second digital asset may be determined using a fixed predetermined ratio of stable value digital asset tokens to second digital asset (e.g., 1 Stable Value Digital Asset Token=1 Second Digital Asset).

In embodiments, the process may continue with step S1606B'. At step S1606B', the digital asset exchange computer system may determine that the second amount of second digital asset is less than the first amount of available second digital asset of the first user. At step S1606C', where the second amount of second digital asset is less than the first amount of available second digital asset of the first user, the digital asset exchange computer system may determine a third amount of second digital asset associated with an updated amount of available second digital asset of the first user. In embodiments, the third amount of second digital asset equals the first amount of available second digital asset of the first user less the second amount of second digital asset. In embodiments, at step S1606C', the digital asset exchange computer system (and/or first user device) may generate a transaction request including instructions to transfer the second amount of second digital asset to a designated public address. The transaction request, in embodiments, may be digitally signed by the digital asset exchange computer system and/or by the digital asset exchange computer system and the first user device (e.g., via MPC)). The transaction request, in embodiments, may be published to the blockchain by the digital asset exchange computer system (e.g., published to the designated public address on the blockchain). The published transaction request, continuing the example, may be verified by one or more nodes on the blockchain and/or executed by one or more nodes on the blockchain. In embodiments, a transaction fee may be required by one or more nodes, e.g., a miner, to verify and/or execute the generated and/or published transaction request.

In embodiments, the process may continue with step S1606D'. At step S1606D', in embodiments, the digital asset exchange computer system may update a second digital asset ledger to reflect the updated amount of available second digital asset. At step S1606E', in embodiments, the digital asset exchange computer system may update a second digital asset ledger associated with the digital asset exchange, increasing the balance of second digital asset by the second amount of second digital asset. In embodiments, the digital asset exchange computer system may transfer the second amount of second digital asset from a digital asset exchange second digital asset account to a stable value digital asset token issuer second digital asset account. In embodiments, the digital asset exchange computer system may periodically transfer fiat between the digital asset exchange fiat account and the stable value digital asset token issuer second digital asset account.

Figure 16D:
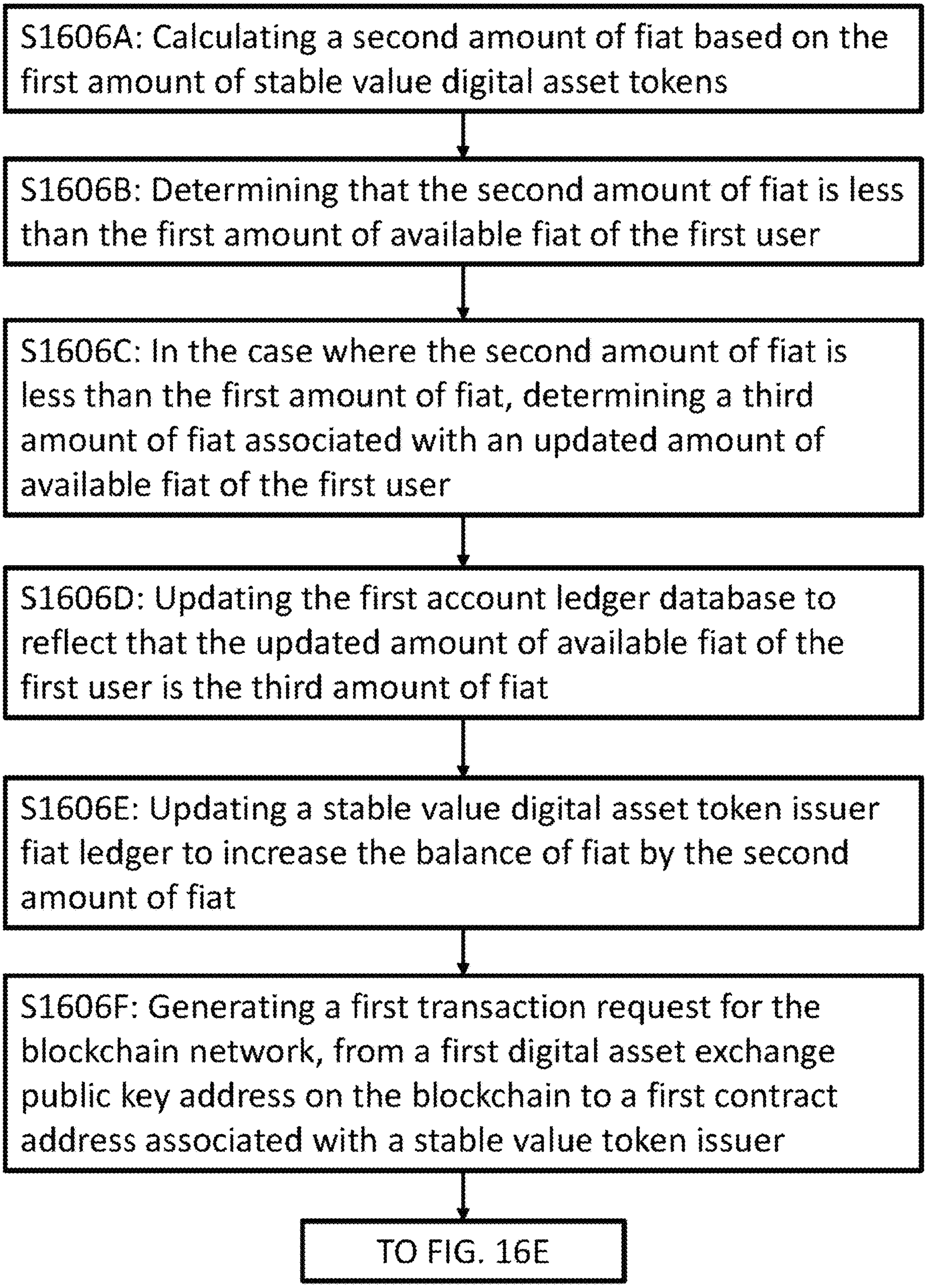
FIGS. 16D, 16E, 16F, and 16G are exemplary flowcharts of a process for processing a withdraw request in accordance with exemplary embodiments in the present invention.
Figure 16E:
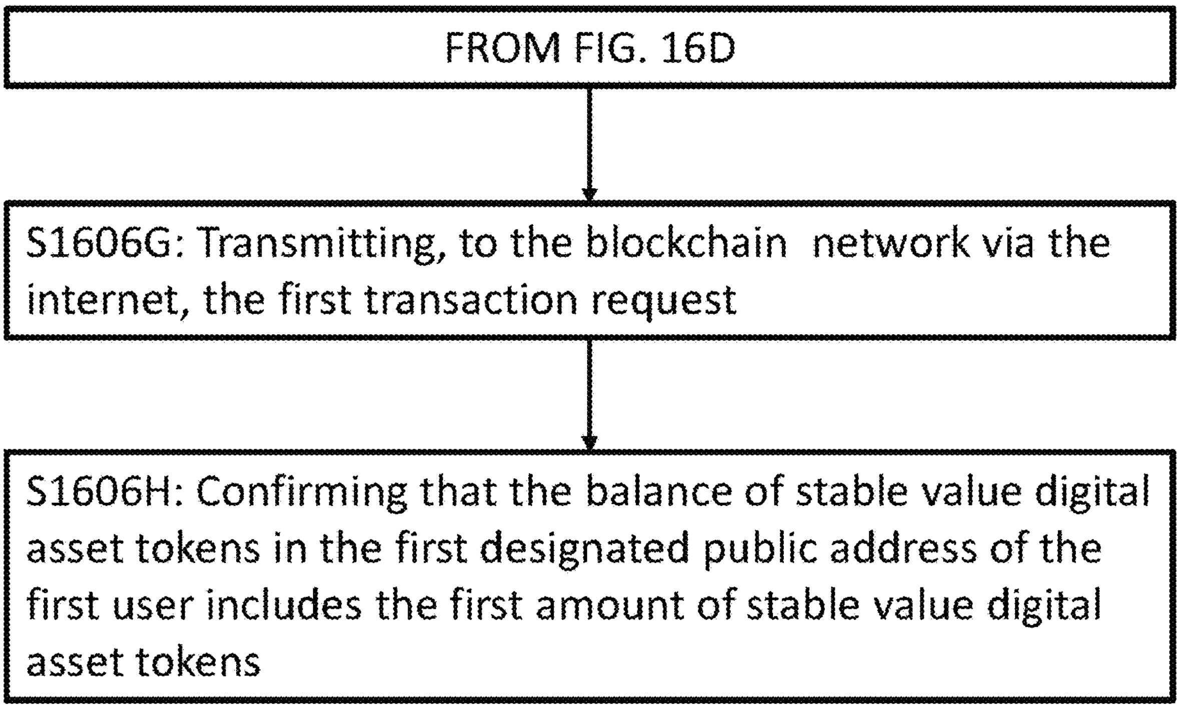
Figure 16F:
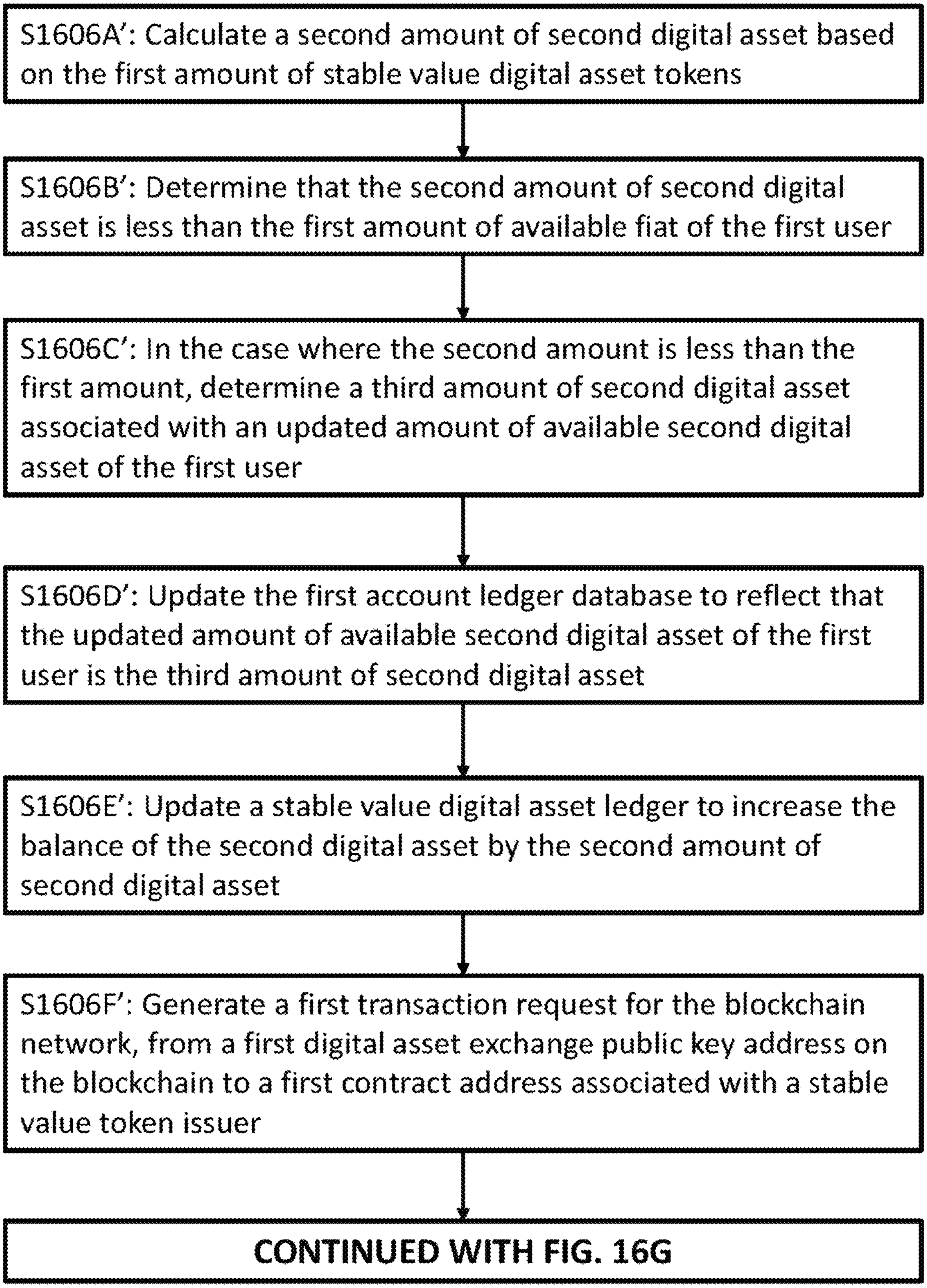
Figure 16G:
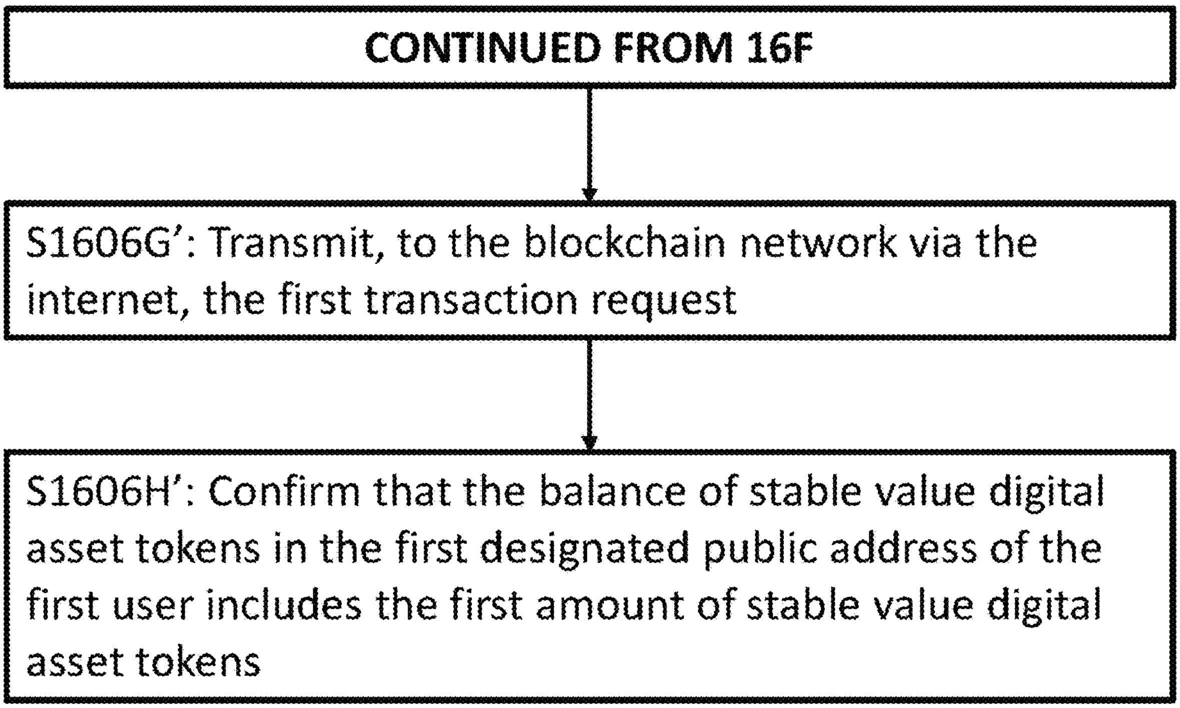

The process of FIG. 16F and/or FIG. 16D may continue with step S1606F of FIG. 16D. Referring back to FIG. 16D, in embodiments, at step S1606F, the digital asset exchange computer system generates a first transaction request for the blockchain network from a first digital asset exchange public key address on the blockchain to a first contract address associated with a stable value digital asset token issuer. In embodiments, the first digital asset exchange public key is mathematically related to a first digital asset exchange private key which is stored in the computer readable member accessible by the digital asset exchange computer system. The first transaction request may comprise a first message including a request to obtain in the first designated public address the first amount of stable value digital asset tokens. In embodiments, the first transaction request is signed with a digital signature generated using at least the digital asset exchange private key. In embodiments, the digital asset exchange computer system digitally signs the first transaction request and/or the digital asset exchange computer system and the first user device digitally signs the first transaction request (e.g., via MPC). In embodiments, the request to obtain may further include a request to generate the first amount of stable value digital asset tokens at the first designated public address of the first user. In embodiments, the request to obtain may include a request to transfer the first amount of stable value digital asset tokens from a stable value digital asset token issuer public address to the first designated public address of the first user.

The process of withdrawing/purchasing stable value digital asset tokens (e.g., in exchange for currency, assets, to name a few) may continue with step S1606G of FIG. 16E. Referring to FIG. 16E, in embodiments, at step S1606G of FIG. 16E, the digital asset exchange computer system transmits the first transaction request to the blockchain network via the Internet. In step S1606H, the digital asset exchange computer system confirms, via reference to the blockchain, that the balance of stable value digital asset tokens in the first designated public address of the first user includes the first amount of stable value digital asset tokens.

In embodiments, as noted above, customers may exchange U.S. dollars for Gemini Dollar tokens at a 1:1 exchange rate, for example, by initiating a withdrawal of Gemini Dollar tokens from their digital asset exchange account to any ETHEREUM address they specify, as indicated in FIG. 15B. The U.S. dollar amount of Gemini Dollar tokens will be debited from the customer's exchange account balance at the time of withdrawal. In embodiments, as noted above, customers may exchange U.S. dollars for a fiat-backed digital asset at an exchange rate based on the value of the fiat-backed digital asset, for example, by initiating a withdrawal of LIBRA Tokens from their account to any public address associated with an account on a peer-to-peer network.

In embodiments, a method may comprise the steps of: (a) authenticating, by an administrator computer system associated with an administrator, an access request by a first user device associated with a first user, to the administrator computer system, comprising the steps of: (1) receiving, by the administrator computer system from the first user device, an authentication request including first user credential information associated with the first user; (2) determining, by the administrator computer system, that the first user device is authorized to access the administrator computer system based at least in part on the first user credential information; (3) generating, by the administrator computer system, first graphical user interface information for displaying a first graphical user interface on the first user device; (4) transmitting, from the administrator computer system to the first user device, the first graphical user interface information; (b) obtaining, by the digital asset computer system from the first user device, a withdraw request, comprising the steps of: (1) receiving, by the administrator computer system from the first user device, a first electronic request to withdraw stable value digital asset tokens, wherein the stable value digital asset token is maintained on a first distributed public transaction ledger in the form of a first blockchain associated with a first underlying digital asset that is maintained by a first blockchain network including a first plurality of geographically distributed computer systems in a first peer-to-peer network, and each stable value digital asset token is issued based on first smart contract instructions provided at a first contract address on the blockchain; (2) in response to the first electronic request, obtaining, by the administrator computer system from a digital asset account ledger database stored on computer readable member accessible by the administrator computer system, first account balance information of the first user indicating a first amount of a second digital asset for the first user held by the administrator on behalf of the first user, wherein the second digital asset is maintained on a second distributed public transaction ledger in the form of a second blockchain associated with a second underlying digital asset that is maintained by a second blockchain network including a second plurality of geographically distributed computer systems in a second peer-to-peer network; (3) generating, by the administrator computer system, second graphical user interface information including at least the first account balance information; (4) transmitting, by the administrator computer system to the first user device, the second graphical user interface information; and (5) receiving, by the administrator computer system from the first user device, a second electronic withdrawal request comprising at least: (A) a first amount of stable value digital asset tokens to be withdrawn; and (B) a destination address on the underlying blockchain to which the first amount of stable value digital asset tokens is provided; (c) processing, by the administrator computer system, the withdraw request by the steps of: (1) calculating, by the administrator computer system, a second amount of second digital asset based on the first amount of stable value digital asset tokens, where the second amount of second digital asset is determined using a fixed predetermined ratio of stable value digital asset tokens to second digital asset; (2) determining, by the administrator computer system, that the second amount of second digital asset is less than the first amount of the second digital asset of the first user; (3) in the case where the second amount of second digital asset is less than the first amount of the second digital asset of the first user, determining a third amount of second digital asset associated with an updated amount of available second digital asset of the first user, wherein the third amount of second digital asset equals the first amount of the second digital asset of the first user less the second amount of second digital asset; (4) updating, by the administrator computer system, the second digital asset account ledger database to reflect that the updated amount of available second digital asset of the first user is the third amount of second digital asset; (5) updating, by the administrator computer system, a stable value digital asset token issuer second digital asset ledger, to increase a balance of second digital asset by the second amount of second digital asset; (6) generating, by the administrator computer system, a first transaction request for the blockchain, from a first administrator public key address on the blockchain, which is mathematically related to a first administrator private key, which is stored in the computer readable member accessible by the administrator computer system, to the first contract address associated with a stable value digital asset token issuer, and including a first message including: i. a request to generate and provide the first amount of stable value digital asset tokens to the destination public address of the first user; and ii. a digital signature generated using the administrator private key, and (7) transmitting, by the administrator computer system to the blockchain network via the Internet, the first transaction request, wherein, in response to the first message in the first transaction request, the blockchain network verifies the digital signature and executes the request to generate and provide the first amount of stable value tokens to the destination public address of the first user; and (8) confirming, by the administrator computer system based on reference to the blockchain, that the first transaction request has been processed by the blockchain network so that the balance of stable value digital asset tokens in the destination public address of the first user includes the first amount of stable value digital asset tokens.

In embodiments, the determining in (a)(2) further determines that the first user is a registered user of the administrator.

In embodiments, the first underlying digital asset is ether and the first blockchain is the Ethereum Blockchain.

In embodiments, the second blockchain is the Bitcoin network.

In embodiments, the second blockchain is the Bitcoin Cash network.

In embodiments, the second blockchain is the Stellar network.

In embodiments, the second blockchain is the Filecoin network.

In embodiments, the second blockchain is the Litecoin network.

In embodiments, the second blockchain is the Tezos network.

In embodiments, the second blockchain is the Zcash network.

In embodiments, the second blockchain is the Neo Network.

In embodiments, the second blockchain is the Ether Classic network.

In embodiments, the underlying digital asset is Neo and the blockchain is the Neo Blockchain.

In embodiments, the second digital asset is Bitcoin.

In embodiments, the second digital asset is Litecoin.

In embodiments, the second digital asset is Bitcoin Cash.

In embodiments, the second digital asset is Filecoin.

In embodiments, the second digital asset is Zcash.

In embodiments, the second digital asset is Stellar.

In embodiments, the second digital asset is Polkadot.

In embodiments, the second digital asset is Atom.

In embodiments, the second digital asset is Tezos.

In embodiments, the updating in (c)(5) further comprises transferring the second amount of second digital asset from an administrator second digital asset account to a stable value digital asset token issuer second digital asset account.

In embodiments, the updating in (c)(5) further comprises periodically transferring second digital asset between the administrator second digital asset account and the stable value digital asset token issuer second digital asset account.

In embodiments, the request to obtain in the destination public address of the first user the first amount of stable value digital asset tokens includes a request to generate the first amount of stable value digital asset tokens at the destination public address of the first user.

In embodiments, the request to obtain in the destination public address of the first user the first amount of stable value digital asset tokens includes a request to transfer the first amount of stable value digital asset tokens from a stable value digital asset token issuer public address to the destination public address of the first user.

In embodiments, a method may comprise the steps of: (a) authenticating, by a digital asset exchange computer system associated with a digital asset exchange, an access request by a first user device associated with a first user, to the digital asset exchange computer system, comprising the steps of: (1) receiving, by the digital asset exchange computer system from the first user device, an authentication request including first user credential information associated with the first user; (2) determining, by the digital asset exchange computer system, that the first user device is authorized to access the digital asset exchange computer system based at least in part on the first user credential information; (3) generating, by the digital asset exchange computer system, first graphical user interface information for displaying a first graphical user interface on the first user device; (4) transmitting, from the digital asset exchange computer system to the first user device, the first graphical user interface information; (b) obtaining, by the digital asset computer system from the first user device, a withdraw request, comprising the steps of: (1) receiving, by the digital asset exchange computer system from the first user device, a first electronic request to withdraw stable value digital asset tokens, wherein the stable value digital asset token is maintained on a first distributed public transaction ledger in the form of a first blockchain associated with a first underlying digital asset that is maintained by a first blockchain network including a first plurality of geographically distributed computer systems in a first peer-to-peer network, and each stable value digital asset token is issued based on first smart contract instructions provided at a first contract address on the blockchain; (2) in response to the first electronic request, obtaining, by the digital asset exchange computer system from a digital asset account ledger database stored on computer readable member accessible by the digital asset exchange computer system, first account balance information of the first user indicating a first amount of a second digital asset for the first user held by the digital asset exchange on behalf of the first user, wherein the second digital asset is maintained on a second distributed public transaction ledger in the form of a second blockchain associated with a second underlying digital asset that is maintained by a second blockchain network including a second plurality of geographically distributed computer systems in a second peer-to-peer network; (3) generating, by the digital asset exchange computer system, second graphical user interface information including at least the first account balance information; (4) transmitting, by the digital asset exchange computer system to the first user device, the second graphical user interface information; and (5) receiving, by the digital asset exchange computer system from the first user device, a second electronic withdrawal request comprising at least: (A) a first amount of stable value digital asset tokens to be withdrawn; and (B) a destination address on the underlying blockchain to which the first amount of stable value digital asset tokens is provided; (c) processing, by the digital asset exchange computer system, the withdraw request by the steps of: (1) calculating, by the digital asset exchange computer system, a second amount of second digital asset based on the first amount of stable value digital asset tokens, where the second amount of second digital asset is determined using a fixed predetermined ratio of stable value digital asset tokens to second digital asset; (2) determining, by the digital asset exchange computer system, that the second amount of second digital asset is less than the first amount of second digital asset of the first user; (3) in the case where the second amount of second digital asset is less than the first amount of currency of the first user, determining a third amount of currency associated with an updated amount of currency of the first user, wherein the third amount of currency equals the first amount of currency of the first user less the second amount of currency; (4) updating, by the digital asset exchange computer system, the currency account ledger database to reflect that the updated amount of second digital asset of the first user is the third amount of second digital asset; (5) updating, by the digital asset exchange computer system, a stable value digital asset token issuer second digital asset ledger, to increase a balance of second digital asset by the second amount of second digital asset; (6) generating, by the digital asset exchange computer system, a first transaction request for the blockchain, from a first digital asset exchange public key address on the blockchain, which is mathematically related to a first digital asset exchange private key, which is stored in the computer readable member accessible by the digital asset exchange computer system, to the first contract address associated with a stable value digital asset token issuer, and including a first message including: i. a request to generate and provide the first amount of stable value digital asset tokens to the destination public address of the first user; and ii. a digital signature generated using the digital asset exchange private key, and (7) transmitting, by the digital asset exchange computer system to the blockchain network via the Internet, the first transaction request, wherein, in response to the first message in the first transaction request, the blockchain network verifies the digital signature and executes the request to generate and provide the first amount of stable value tokens to the destination public address of the first user; and (8) confirming, by the digital asset exchange computer system based on reference to the blockchain, that the first transaction request has been processed by the blockchain network so that the balance of stable value digital asset tokens in the destination public address of the first user includes the first amount of stable value digital asset tokens.

In embodiments, the determining in (a)(2) further determines that the first user is a registered user of the digital asset exchange.

In embodiments, the digital asset exchange is licensed by a government regulatory authority.

In embodiments, the first underlying digital asset is Ether and the first blockchain is the Ethereum Blockchain.

In embodiments, the second blockchain is the Bitcoin network.

In embodiments, the second blockchain is the Bitcoin Cash network.

In embodiments, the second blockchain is the Stellar network.

In embodiments, the second blockchain is the Filecoin network.

In embodiments, the second blockchain is the Litecoin network.

In embodiments, the second blockchain is the Tezos network.

In embodiments, the second blockchain is the Zcash network.

In embodiments, the second blockchain is the Neo Network.

In embodiments, the second blockchain is the Ether Classic network.

In embodiments, the first underlying digital asset is Neo and the first blockchain is the Neo Blockchain.

In embodiments, the second digital asset is Bitcoin.

In embodiments, the second digital asset is Litecoin.

In embodiments, the second digital asset is Bitcoin Cash.

In embodiments, the second digital asset is Filecoin.

In embodiments, the second digital asset is Zcash.

In embodiments, the second digital asset is Stellar.

In embodiments, the second digital asset is Polkadot.

In embodiments, the second digital asset is Atom.

In embodiments, the second digital asset is Tezos.

In embodiments, the updating in (c)(5) further comprises transferring the second amount of currency from a digital asset exchange currency account to a stable value digital asset token issuer currency account.

In embodiments, the updating in (c)(5) further comprises periodically transferring currency between the digital asset exchange currency account and the stable value digital asset token issuer currency account.

In embodiments, the request to obtain in the destination public address of the first user the first amount of stable value digital asset tokens includes a request to generate the first amount of stable value digital asset tokens at the destination public address of the first user.

In embodiments, the request to obtain in the destination public address of the first user the first amount of stable value digital asset tokens includes a request to generate the first amount of stable value digital asset tokens at the destination public address of the first user.

In embodiments, a method may comprise the steps of: (a) authenticating, by a digital asset token issuer computer system associated with a digital asset token issuer, an access request by a first user device associated with a first user, to the digital asset token issuer computer system, comprising the steps of: (1) receiving, by the digital asset token issuer computer system from the first user device, an authentication request including first user credential information associated with the first user; (2) determining, by the digital asset token issuer computer system, that the first user device is authorized to access the digital asset token issuer computer system based at least in part on the first user credential information; (3) generating, by the digital asset token issuer computer system, first graphical user interface information for displaying a first graphical user interface on the first user device; (4) transmitting, from the digital asset token issuer computer system to the first user device, the first graphical user interface information; (b) obtaining, by the digital asset computer system from the first user device, a withdraw request, comprising the steps of: (1) receiving, by the digital asset token issuer computer system from the first user device, a first electronic request to withdraw stable value digital asset tokens, wherein the stable value digital asset token is maintained on a distributed public transaction ledger in the form of a blockchain associated with an underlying digital asset that is maintained by a blockchain network including a plurality of geographically distributed computer systems in a peer-to-peer network, and each stable value digital asset token is issued based on first smart contract instructions provided at a first contract address on the blockchain; (2) in response to the first electronic request, obtaining, by the digital asset token issuer computer system from a second digital asset account ledger database stored on computer readable member accessible by the digital asset token issuer computer system, first account balance information of the first user indicating a first amount of a second digital asset for the first user held by the digital asset token issuer on behalf of the first user, wherein the second digital asset is maintained on a second distributed public transaction ledger in the form of a second blockchain associated with a second underlying digital asset that is maintained by a second blockchain network including a second plurality of geographically distributed computer systems in a second peer-to-peer network; (3) generating, by the digital asset token issuer computer system, second graphical user interface information including at least the first account balance information; (4) transmitting, by the digital asset token issuer computer system to the first user device, the second graphical user interface information; and (5) receiving, by the digital asset token issuer computer system from the first user device, a second electronic withdrawal request comprising at least: (A) a first amount of stable value digital asset tokens to be withdrawn; and (B) a destination address on the underlying blockchain to which the first amount of stable value digital asset tokens is provided; (c) processing, by the digital asset token issuer computer system, the withdraw request by the steps of: (1) calculating, by the digital asset token issuer computer system, a second amount of second digital asset based on the first amount of stable value digital asset tokens, where the second amount of second digital asset is determined using a fixed predetermined ratio of stable value digital asset tokens to second digital asset; (2) determining, by the digital asset token issuer computer system, that the second amount of second digital asset is less than the first amount of second digital asset of the first user; (3) in the case where the second amount of second digital asset is less than the first amount of second digital asset of the first user, determining a third amount of second digital asset associated with an updated amount of second digital asset of the first user, wherein the third amount of second digital asset equals the first amount of second digital asset of the first user less the second amount of second digital asset; (4) updating, by the digital asset token issuer computer system, the second digital asset account ledger database to reflect that the updated amount of second digital asset of the first user is the third amount of second digital asset; (5) updating, by the digital asset token issuer computer system, a stable value digital asset token issuer second digital asset ledger, to increase a balance of second digital asset by the second amount of second digital asset; (6) generating, by the digital asset token issuer computer system, a first transaction request for the blockchain, from a first digital asset token issuer public key address on the blockchain, which is mathematically related to a first digital asset token issuer private key, which is stored in the computer readable member accessible by the digital asset token issuer computer system, to the first contract address associated with a stable value digital asset token issuer, and including a first message including: i. a request to generate and provide the first amount of stable value digital asset tokens to the destination public address of the first user; and ii. a digital signature generated using the digital asset token issuer private key, and (7) transmitting, by the digital asset token issuer computer system to the blockchain network via the Internet, the first transaction request, wherein, in response to the first message in the first transaction request, the blockchain network verifies the digital signature and executes the request to generate and provide the first amount of stable value tokens to the destination public address of the first user; and (8) confirming, by the digital asset token issuer computer system based on reference to the blockchain, that the first transaction request has been processed by the blockchain network so that the balance of stable value digital asset tokens in the destination public address of the first user includes the first amount of stable value digital asset tokens.

In embodiments, the determining in (a)(2) further determines that the first user is a registered user of the digital asset token issuer.

In embodiments, the digital asset token issuer is licensed by a government regulatory authority.

In embodiments, the first underlying digital asset is Ether and the blockchain is the Ethereum Blockchain.

In embodiments, the second blockchain is the Bitcoin network.

In embodiments, the second blockchain is the Bitcoin Cash network.

In embodiments, the second blockchain is the Stellar network.

In embodiments, the second blockchain is the Filecoin network.

In embodiments, the second blockchain is the Litecoin network.

In embodiments, the second blockchain is the Tezos network.

In embodiments, the second blockchain is the Zcash network.

In embodiments, the second blockchain is the Neo Network.

In embodiments, the second blockchain is the Ether Classic network.

In embodiments, the first underlying digital asset is neo and the first blockchain is the Neo Blockchain.

In embodiments, the second digital asset is Bitcoin.

In embodiments, the second digital asset is Litecoin.

In embodiments, the second digital asset is Bitcoin Cash.

In embodiments, the second digital asset is Filecoin.

In embodiments, the second digital asset is Zcash.

In embodiments, the second digital asset is Stellar.

In embodiments, the second digital asset is Polkadot.

In embodiments, the second digital asset is Atom.

In embodiments, the second digital asset is Tezos.

In embodiments, the updating in (c)(5) further comprises transferring the second amount of second digital asset from a digital asset token issuer second digital asset account to a stable value digital asset token issuer second digital asset account.

In embodiments, the updating in (c)(5) further comprises periodically transferring second digital asset between the digital asset token issuer second digital asset account and the stable value digital asset token issuer second digital asset account.

In embodiments, the request to obtain in the destination public address of the first user the first amount of stable value digital asset tokens includes a request to generate the first amount of stable value digital asset tokens at the destination public address of the first user.

In embodiments, the request to obtain in the destination public address of the first user the first amount of stable value digital asset tokens includes a request to transfer the first amount of stable value digital asset tokens from a stable value digital asset token issuer public address to the destination public address of the first user.

In embodiments, a method may comprise the steps of: (a) authenticating, by an administrator computer system associated with an administrator, an access request by a first user device associated with a first user, to the administrator computer system, comprising the steps of: (1) receiving, by the administrator computer system from the first user device, an authentication request including first user credential information associated with the first user; (2) determining, by the administrator computer system, that the first user device is authorized to access the administrator computer system based at least in part on the first user credential information; (3) generating, by the administrator computer system, first graphical user interface information for displaying a first graphical user interface on the first user device; (4) transmitting, from the administrator computer system to the first user device, the first graphical user interface information; (b) obtaining, by the digital asset computer system from the first user device, a withdraw request, comprising the steps of: (1) receiving, by the administrator computer system from the first user device, a first electronic request to withdraw stable value digital asset tokens, wherein the stable value digital asset token is maintained on a distributed public transaction ledger in the form of a blockchain associated with an underlying digital asset that is maintained by a blockchain network including a plurality of geographically distributed computer systems in a peer-to-peer network, and each stable value digital asset token is issued based on first smart contract instructions provided at a first contract address on the blockchain; (2) in response to the first electronic request, obtaining, by the administrator computer system from a currency account ledger database stored on computer readable member accessible by the administrator computer system, first account balance information of the first user indicating a first amount of available currency for the first user held by the administrator on behalf of the first user; (3) generating, by the administrator computer system, second graphical user interface information including at least the first account balance information; (4) transmitting, by the administrator computer system to the first user device, the second graphical user interface information; and (5) receiving, by the administrator computer system from the first user device, a second electronic withdrawal request comprising at least: (A) a first amount of stable value digital asset tokens to be withdrawn; and (B) a destination address on the underlying blockchain to which the first amount of stable value digital asset tokens is provided; (c) processing, by the administrator computer system, the withdraw request by the steps of: (1) calculating, by the administrator computer system, a second amount of currency based on the first amount of stable value digital asset tokens, where the second amount of currency is determined using a fixed predetermined ratio of stable value digital asset tokens to currency; (2) determining, by the administrator computer system, that the second amount of currency is less than the first amount of available currency of the first user; (3) in the case where the second amount of currency is less than the first amount of available currency of the first user, determining a third amount of currency associated with an updated amount of available currency of the first user, wherein the third amount of currency equals the first amount of available currency of the first user less the second amount of currency; (4) updating, by the administrator computer system, the currency account ledger database to reflect that the updated amount of available currency of the first user is the third amount of currency; (5) updating, by the administrator computer system, a stable value digital asset token issuer currency ledger, to increase a balance of currency by the second amount of currency; (6) generating, by the administrator computer system, a first transaction request for the blockchain, from a first administrator public key address on the blockchain, which is mathematically related to a first administrator private key, which is stored in the computer readable member accessible by the administrator computer system, to the first contract address associated with a stable value digital asset token issuer, and including a first message including: i. a request to generate and provide the first amount of stable value digital asset tokens to the destination public address of the first user; and ii. a digital signature generated using the administrator private key, and (7) transmitting, by the administrator computer system to the blockchain network via the Internet, the first transaction request, wherein, in response to the first message in the first transaction request, the blockchain network verifies the digital signature and executes the request to generate and provide the first amount of stable value tokens to the destination public address of the first user; and (8) confirming, by the administrator computer system based on reference to the blockchain, that the first transaction request has been processed by the blockchain network so that the balance of stable value digital asset tokens in the destination public address of the first user includes the first amount of stable value digital asset tokens.

In embodiments, the determining in (a)(2) further determines that the first user is a registered user of the administrator.

In embodiments, the underlying digital asset is ether and the blockchain is the Ethereum Blockchain.

In embodiments, the underlying digital asset is neo and the blockchain is the Neo Blockchain.

In embodiments, the currency is a fiat currency.

In embodiments, the fiat currency is U.S. dollar.

In embodiments, the fixed predetermined ratio is one stable value digital asset token is equal to one U.S. dollar.

In embodiments, the fixed predetermined ratio is one hundred stable value digital asset tokens is equal to one U.S. dollar.

In embodiments, the fiat currency is GB pound.

In embodiments, the fiat currency is SG dollar.

In embodiments, the fiat currency is EUR.

In embodiments, the fiat currency is HK dollar.

In embodiments, the fiat currency is Canadian dollar.

In embodiments, the fiat currency is Australian dollar.

In embodiments, the fiat currency is Yen.

In embodiments, the currency is a cryptocurrency.

In embodiments, the cryptocurrency is Bitcoin.

In embodiments, the cryptocurrency is Litecoin.

In embodiments, the cryptocurrency is Bitcoin Cash.

In embodiments, the cryptocurrency is Filecoin.

In embodiments, the cryptocurrency is Zcash.

In embodiments, the cryptocurrency is Stellar.

In embodiments, the cryptocurrency is Polkadot.

In embodiments, the cryptocurrency is Atom.

In embodiments, the cryptocurrency is Tezos.

In embodiments, the updating in (c)(5) further comprises transferring the second amount of currency from an administrator currency account to a stable value digital asset token issuer currency account.

In embodiments, the updating in (c)(5) further comprises periodically transferring currency between the administrator currency account and the stable value digital asset token issuer currency account.

In embodiments, the request to obtain in the destination public address of the first user the first amount of stable value digital asset tokens includes a request to generate the first amount of stable value digital asset tokens at the destination public address of the first user.

In embodiments, the request to obtain in the destination public address of the first user the first amount of stable value digital asset tokens includes a request to transfer the first amount of stable value digital asset tokens from a stable value digital asset token issuer public address to the destination public address of the first user.

In embodiments, a method may comprise the steps of: (a) authenticating, by a digital asset exchange computer system associated with a digital asset exchange, an access request by a first user device associated with a first user, to the digital asset exchange computer system, comprising the steps of: (1) receiving, by the digital asset exchange computer system from the first user device, an authentication request including first user credential information associated with the first user; (2) determining, by the digital asset exchange computer system, that the first user device is authorized to access the digital asset exchange computer system based at least in part on the first user credential information; (3) generating, by the digital asset exchange computer system, first graphical user interface information for displaying a first graphical user interface on the first user device; (4) transmitting, from the digital asset exchange computer system to the first user device, the first graphical user interface information; (b) obtaining, by the digital asset computer system from the first user device, a withdraw request, comprising the steps of: (1) receiving, by the digital asset exchange computer system from the first user device, a first electronic request to withdraw stable value digital asset tokens, wherein the stable value digital asset token is maintained on a distributed public transaction ledger in the form of a blockchain associated with an underlying digital asset that is maintained by a blockchain network including a plurality of geographically distributed computer systems in a peer-to-peer network, and each stable value digital asset token is issued based on first smart contract instructions provided at a first contract address on the blockchain; (2) in response to the first electronic request, obtaining, by the digital asset exchange computer system from a currency account ledger database stored on computer readable member accessible by the digital asset exchange computer system, first account balance information of the first user indicating a first amount of available currency for the first user held by the digital asset exchange on behalf of the first user; (3) generating, by the digital asset exchange computer system, second graphical user interface information including at least the first account balance information; (4) transmitting, by the digital asset exchange computer system to the first user device, the second graphical user interface information; and (5) receiving, by the digital asset exchange computer system from the first user device, a second electronic withdrawal request comprising at least: (A) a first amount of stable value digital asset tokens to be withdrawn; and (B) a destination address on the underlying blockchain to which the first amount of stable value digital asset tokens is provided; (c) processing, by the digital asset exchange computer system, the withdraw request by the steps of: (1) calculating, by the digital asset exchange computer system, a second amount of currency based on the first amount of stable value digital asset tokens, where the second amount of currency is determined using a fixed predetermined ratio of stable value digital asset tokens to currency; (2) determining, by the digital asset exchange computer system, that the second amount of currency is less than the first amount of available currency of the first user; (3) in the case where the second amount of currency is less than the first amount of available currency of the first user, determining a third amount of currency associated with an updated amount of available currency of the first user, wherein the third amount of currency equals the first amount of available currency of the first user less the second amount of currency; (4) updating, by the digital asset exchange computer system, the currency account ledger database to reflect that the updated amount of available currency of the first user is the third amount of currency; (5) updating, by the digital asset exchange computer system, a stable value digital asset token issuer currency ledger, to increase a balance of currency by the second amount of currency; (6) generating, by the digital asset exchange computer system, a first transaction request for the blockchain, from a first digital asset exchange public key address on the blockchain, which is mathematically related to a first digital asset exchange private key, which is stored in the computer readable member accessible by the digital asset exchange computer system, to the first contract address associated with a stable value digital asset token issuer, and including a first message including: i. a request to generate and provide the first amount of stable value digital asset tokens to the destination public address of the first user; and ii. a digital signature generated using the digital asset exchange private key, and (7) transmitting, by the digital asset exchange computer system to the blockchain network via the Internet, the first transaction request, wherein, in response to the first message in the first transaction request, the blockchain network verifies the digital signature and executes the request to generate and provide the first amount of stable value tokens to the destination public address of the first user; and (8) confirming, by the digital asset exchange computer system based on reference to the blockchain, that the first transaction request has been processed by the blockchain network so that the balance of stable value digital asset tokens in the destination public address of the first user includes the first amount of stable value digital asset tokens.

In embodiments, the determining in (a)(2) further determines that the first user is a registered user of the digital asset exchange.

In embodiments,

In embodiments, the digital asset exchange is licensed by a government regulatory authority.

In embodiments, the underlying digital asset is ether and the blockchain is the Ethereum Blockchain.

In embodiments, the underlying digital asset is neo and the blockchain is the Neo Blockchain.

In embodiments, the currency is a fiat currency.

In embodiments, the fiat currency is U.S. dollar.

In embodiments, the fixed predetermined ratio is one stable value digital asset token is equal to one U.S. dollar.

In embodiments, the fixed predetermined ratio is one hundred stable value digital asset tokens is equal to one U.S. dollar.

In embodiments, the fiat currency is GB pound.

In embodiments, the fiat currency is SG dollar.

In embodiments, the fiat currency is EUR.

In embodiments, the fiat currency is HK dollar.

In embodiments, the fiat currency is Canadian dollar.

In embodiments, the fiat currency is Australian dollar.

In embodiments, the fiat currency is Yen.

In embodiments, the currency is a cryptocurrency.

In embodiments, the cryptocurrency is Bitcoin.

In embodiments, the cryptocurrency is Litecoin.

In embodiments, the cryptocurrency is Bitcoin Cash.

In embodiments, the cryptocurrency is Filecoin.

In embodiments, the cryptocurrency is Zcash.

In embodiments, the cryptocurrency is Stellar.

In embodiments, the cryptocurrency is Polkadot.

In embodiments, the cryptocurrency is Atom.

In embodiments, the cryptocurrency is Tezos.

In embodiments, the updating in (c)(5) further comprises transferring the second amount of currency from a digital asset exchange currency account to a stable value digital asset token issuer currency account.

In embodiments, the updating in (c)(5) further comprises periodically transferring currency between the digital asset exchange currency account and the stable value digital asset token issuer currency account.

In embodiments, the request to obtain in the destination public address of the first user the first amount of stable value digital asset tokens includes a request to generate the first amount of stable value digital asset tokens at the destination public address of the first user.

In embodiments, the request to obtain in the destination public address of the first user the first amount of stable value digital asset tokens includes a request to transfer the first amount of stable value digital asset tokens from a stable value digital asset token issuer public address to the destination public address of the first user.

In embodiments, a method may comprise the steps of: (a) authenticating, by a digital asset token issuer computer system associated with a digital asset token issuer, an access request by a first user device associated with a first user, to the digital asset token issuer computer system, comprising the steps of: (1) receiving, by the digital asset token issuer computer system from the first user device, an authentication request including first user credential information associated with the first user; (2) determining, by the digital asset token issuer computer system, that the first user device is authorized to access the digital asset token issuer computer system based at least in part on the first user credential information; (3) generating, by the digital asset token issuer computer system, first graphical user interface information for displaying a first graphical user interface on the first user device; (4) transmitting, from the digital asset token issuer computer system to the first user device, the first graphical user interface information; (b) obtaining, by the digital asset computer system from the first user device, a withdraw request, comprising the steps of: (1) receiving, by the digital asset token issuer computer system from the first user device, a first electronic request to withdraw stable value digital asset tokens, wherein the stable value digital asset token is maintained on a distributed public transaction ledger in the form of a blockchain associated with an underlying digital asset that is maintained by a blockchain network including a plurality of geographically distributed computer systems in a peer-to-peer network, and each stable value digital asset token is issued based on first smart contract instructions provided at a first contract address on the blockchain; (2) in response to the first electronic request, obtaining, by the digital asset token issuer computer system from a currency account ledger database stored on computer readable member accessible by the digital asset token issuer computer system, first account balance information of the first user indicating a first amount of available currency for the first user held by the digital asset token issuer on behalf of the first user; (3) generating, by the digital asset token issuer computer system, second graphical user interface information including at least the first account balance information; (4) transmitting, by the digital asset token issuer computer system to the first user device, the second graphical user interface information; and (5) receiving, by the digital asset token issuer computer system from the first user device, a second electronic withdrawal request comprising at least: (A) a first amount of stable value digital asset tokens to be withdrawn; and (B) a destination address on the underlying blockchain to which the first amount of stable value digital asset tokens is provided; (c) processing, by the digital asset token issuer computer system, the withdraw request by the steps of: (1) calculating, by the digital asset token issuer computer system, a second amount of currency based on the first amount of stable value digital asset tokens, where the second amount of currency is determined using a fixed predetermined ratio of stable value digital asset tokens to currency; (2) determining, by the digital asset token issuer computer system, that the second amount of currency is less than the first amount of available currency of the first user; (3) in the case where the second amount of currency is less than the first amount of available currency of the first user, determining a third amount of currency associated with an updated amount of available currency of the first user, wherein the third amount of currency equals the first amount of available currency of the first user less the second amount of currency; (4) updating, by the digital asset token issuer computer system, the currency account ledger database to reflect that the updated amount of available currency of the first user is the third amount of currency; (5) updating, by the digital asset token issuer computer system, a stable value digital asset token issuer currency ledger, to increase a balance of currency by the second amount of currency; (6) generating, by the digital asset token issuer computer system, a first transaction request for the blockchain, from a first digital asset token issuer public key address on the blockchain, which is mathematically related to a first digital asset token issuer private key, which is stored in the computer readable member accessible by the digital asset token issuer computer system, to the first contract address associated with a stable value digital asset token issuer, and including a first message including: i. a request to generate and provide the first amount of stable value digital asset tokens to the destination public address of the first user; and ii. a digital signature generated using the digital asset token issuer private key, and (7) transmitting, by the digital asset token issuer computer system to the blockchain network via the Internet, the first transaction request, wherein, in response to the first message in the first transaction request, the blockchain network verifies the digital signature and executes the request to generate and provide the first amount of stable value tokens to the destination public address of the first user; and (8) confirming, by the digital asset token issuer computer system based on reference to the blockchain, that the first transaction request has been processed by the blockchain network so that the balance of stable value digital asset tokens in the destination public address of the first user includes the first amount of stable value digital asset tokens.

In embodiments, the determining in (a)(2) further determines that the first user is a registered user of the digital asset token issuer.

In embodiments, the digital asset token issuer is licensed by a government regulatory authority.

In embodiments, the underlying digital asset is ether and the blockchain is the Ethereum Blockchain.

In embodiments, the underlying digital asset is neo and the blockchain is the Neo Blockchain.

In embodiments, the currency is a fiat currency.

In embodiments, the fiat currency is U.S. dollar.

In embodiments, the fixed predetermined ratio is one stable value digital asset token is equal to one U.S. dollar.

In embodiments, the fixed predetermined ratio is one hundred stable value digital asset tokens is equal to one U.S. dollar.

In embodiments, the fiat currency is GB pound.

In embodiments, the fiat currency is SG dollar.

In embodiments, the fiat currency is EUR.

In embodiments, the fiat currency is HK dollar.

In embodiments, the fiat currency is Canadian dollar.

In embodiments, the fiat currency is Australian dollar.

In embodiments, the fiat currency is Yen.

In embodiments, the currency is a cryptocurrency.

In embodiments, the cryptocurrency is Bitcoin.

In embodiments, the cryptocurrency is Litecoin.

In embodiments, the cryptocurrency is Bitcoin Cash.

In embodiments, the cryptocurrency is Filecoin.

In embodiments, the cryptocurrency is Zcash.

In embodiments, the cryptocurrency is Stellar.

In embodiments, the cryptocurrency is Polkadot.

In embodiments, the cryptocurrency is Atom.

In embodiments, the cryptocurrency is Tezos.

In embodiments, the updating in (c)(5) further comprises transferring the second amount of currency from a digital asset token issuer currency account to a stable value digital asset token issuer currency account.

In embodiments, the updating in (c)(5) further comprises periodically transferring currency between the digital asset token issuer currency account and the stable value digital asset token issuer currency account.

In embodiments, the request to obtain in the destination public address of the first user the first amount of stable value digital asset tokens includes a request to generate the first amount of stable value digital asset tokens at the destination public address of the first user.

In embodiments, the request to obtain in the destination public address of the first user the first amount of stable value digital asset tokens includes a request to transfer the first amount of stable value digital asset tokens from a stable value digital asset token issuer public address to the destination public address of the first user.

Figure 68A:
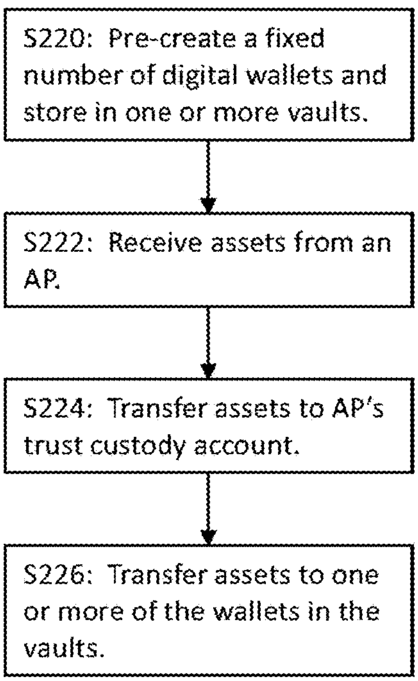
FIGS. 68A-68D are flow charts of various exemplary processes for assigning digital math-based assets, such as BITCOIN, obtained during a creation and distributing them among digital wallets in accordance with embodiments of the present invention.
Figure 68B:
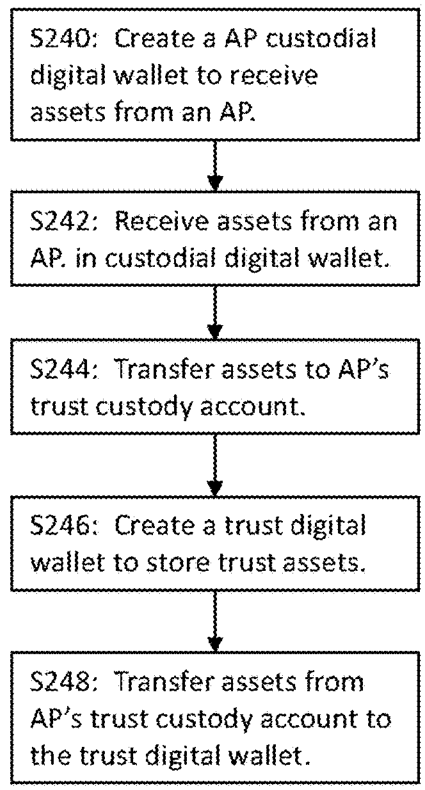

FIGS. 68A and 68B are flow charts of various exemplary processes for assigning digital assets (e.g., BITCOIN) obtained at creation and distributing them among digital wallets in accordance with embodiments of the present invention.

For example, with reference to FIG. 68A, an exemplary creation distribution waterfall is illustrated. In embodiments, these steps may be performed using AP computer systems, operated by one or more APs requesting creation units, and trust computer systems, operated by the trustee, custodian and/or administrator on behalf of the trust. In step S220, a fixed number of digital wallets to be stored in one or more vaults can be created in advance of anticipated use. In creating the digital wallets, as described herein e.g., in relation to FIG. 68A, the private key for each wallet may be parsed into two or more segments and/or encoded and stored in paper form. In embodiments, the key segments may be further encrypted before storing in paper form. The corresponding public key may be kept readily available for the administrator and/or custodian to access.

In step S222, an AP using an AP computer system can send to the trustee, custodian and/or administrator using a trust computer system, which in turn receives, assets (e.g., digital math assets such as BITCOIN) to be deposited into the trust. For example, the trust computer system can send electronically to the AP computer system a public key associated with a trust custody account to receive the digital assets. The AP can then enter the public key into an AP digital wallet on the AP computer system to send the required digital assets (e.g., BITCOIN) from the AP account to the trust custody account using the AP's private key and the public key associated with the trust custody account. The trust computer system can then acknowledge (e.g., electronically) receipt of the transferred digital assets in the trust custody account. In embodiments, one or more AP accounts and/or one or more trust custody accounts can be used. The trust custody account can be an AP custody account and/or a vault account, as appropriate, to name a few.

In embodiments, in step S224, after receipt of digital assets deposited into the trust, digital assets deposited by an AP into the trust, can be transferred using the trust computer system to one or more digital wallets associated with an AP trust custody account. In embodiments, the initial transfer of assets may be made directly one or more AP accounts into one or more AP custody accounts.

In step S226, the digital assets in the digital wallets associated with the AP trust custody account may be transferred using the trust computer system in whole or part into one or more of the previously created digital wallets whose private key segments are stored in vaults. In embodiments, the digital assets may be distributed by the trust computer system to trust wallets, such as discussed in the context of FIG. 68B herein, or according to another distribution algorithm.

With reference to FIG. 68B, an exemplary creation distribution waterfall is illustrated. In embodiments, these steps may be performed using AP computer systems, operated by one or more APs requesting creation units, and trust computer systems, operated by the trustee, custodian and/or administrator on behalf of the trust.

In step S240, an AP custodial digital wallet can be created using the trust computer system to receive assets from an AP digital wallet on an AP computer system.

In step S242, an AP using an AP computer system can send to the trustee, custodian and/or administrator using a trust computer system (which in turn receives) assets (e.g., digital math assets such as BITCOIN) to be deposited into the trust. For example, the trust computer system can send electronically to the AP computer system a public key associated with a trust custody account to receive the digital assets. The AP can then enter the public key into an AP digital wallet on the AP computer system to send the required digital assets (e.g., BITCOIN) from the AP account to the trust custody account using the AP's private key and the public key associated with the trust custody account. The trust computer system can then acknowledge (e.g., electronically) receipt of the transferred digital assets in the trust custody account. In embodiments, one or more AP accounts and/or one or more trust custody accounts can be used. The trust custody account can be an AP custody account and/or a vault account, as appropriate, to name a few.

In step S244, after receipt of digital assets deposited into the trust, digital assets deposited by an AP into the trust, can be transferred using the trust computer system to one or more digital wallets associated with an AP trust custody account. In embodiments, the initial transfer of assets may be made directly one or more AP accounts into one or more AP custody accounts.

In embodiments, the creation distribution methodology/algorithm can depend at least in part upon one or more of the following criteria or parameters:

- setting a maximum amount of digital assets stored in each wallet (e.g., limiting to 10,000 BITCOIN in each wallet);
- setting a minimum amount of digital assets stored in each wallet (e.g., at least 100 BITCOIN in each wallet);
- setting a maximum ratio of maximum amount to minimum amount of digital assets stored in each wallet (e.g., a 10-to-1 ratio);
- setting a random amount of digital assets to be stored in each wallet, wherein the random amount is greater than a minimum amount and less than a maximum amount;
- limiting the number of uses of each wallet (e.g., never using the same wallet more than once);
- resetting the maximum amount and the minimum amount of digital assets stored in each wallet based at least in part on increased or decreased volume of digital assets held by the trust;
- setting a maximum amount of digital assets transferred to each wallet in any given transaction (e.g., limiting to 10,000 BITCOIN in each wallet);
- setting a minimum amount of digital assets transferred to each wallet in any given transaction (e.g., at least 100 BITCOIN in each wallet);
- setting a maximum ratio of maximum amount to minimum amount of digital assets transferred to each wallet in any given transaction (e.g., a 10-to-1 ratio);

setting a random amount of digital assets to be transferred to each wallet in any given transaction, wherein the random amount is greater than a minimum amount and less than a maximum amount;

limiting the number of transfers to a given wallet (e.g., never using the same wallet more than once, never make more than two transfers to the same wallet during a year period, to name a few);

resetting the maximum amount and the minimum amount of digital assets transferred to and/or from each wallet based at least in part on increased or decreased volumes of digital assets held by the trust; and/or performing transfers to one or more wallets, e.g., vault wallets, at random and/or varied times of day (e.g., make a transfer at 4:00 PM ET on one day and make a transfer at 4:18 PM ET the following day; make a transfer to one wallet at 4:00 PM ET and another wallet at 5:13 PM ET the same day), to name a few.

Figure 68C:
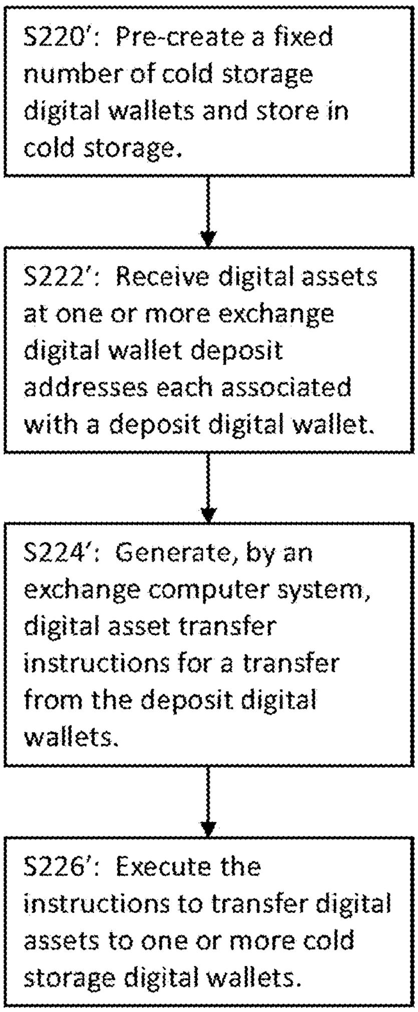

With reference to FIG. 68C, an exemplary deposit distribution waterfall is illustrated. In embodiments, these steps may be performed using an exchange computer system.

In step S220', a fixed number of digital wallets to be stored in one or more vaults can be created in advance of anticipated use. In generating the digital wallets, as described herein e.g., in relation to FIG. 68A, the private key for each wallet may be parsed into two or more segments and/or encoded and stored in paper form. In embodiments, the key segments may be further encrypted before storing in paper form. In embodiments, the private keys, which can include multiple private keys for multi-signature wallets, may be stored electronically, e.g., on non-transitory computer-readable memory. The corresponding public key may be kept readily available for an exchange employee and/or private key custodian to access. In embodiments, cold storage wallet private keys may be stored remotely, e.g., in a bank vault, bank safety deposit box, and/or precious metal vault. In embodiments, cold storage wallet private keys may be stored in a locked room and/or in a safe, which may be located at the premises of exchange employees.

In step S222', an exchange user using computer system or user device can send to a deposit address associated with a deposit digital wallet maintained by the exchange, which in turn receives, assets (e.g., digital math assets such as BITCOIN) to be deposited with the exchange. For example, the exchange computer system can send electronically to the user device a public key or deposit address associated with an exchange deposit wallet to receive the digital assets. The user can then enter the public key or address into a user digital wallet on the user device to send the digital assets (e.g., BITCOIN) to the exchange deposit wallet using a private key associated with the user digital wallet and the address associated with the exchange deposit wallet. The exchange computer system can then acknowledge (e.g., electronically) receipt of the transferred digital assets in the deposit wallet. In embodiments, one or more private keys associated with deposit digital wallets may be stored in cold storage.

In embodiments, in step S224', the exchange computer system may generate digital asset instructions (e.g., machine-readable instructions comprising at least a destination digital wallet address) for a transfer from the deposit digital wallet to one or more cold storage wallets.

In step S226', the digital assets in the deposit digital wallets may be transferred using the exchange computer system in whole or part into one or more of the previously created cold storage digital wallets whose private key segments are stored in cold storage. In embodiments, the digital assets may be distributed by the exchange computer system to exchange digital wallets, such as discussed in the context of FIG. 68D herein, or according to another distribution algorithm.

Figure 68D:
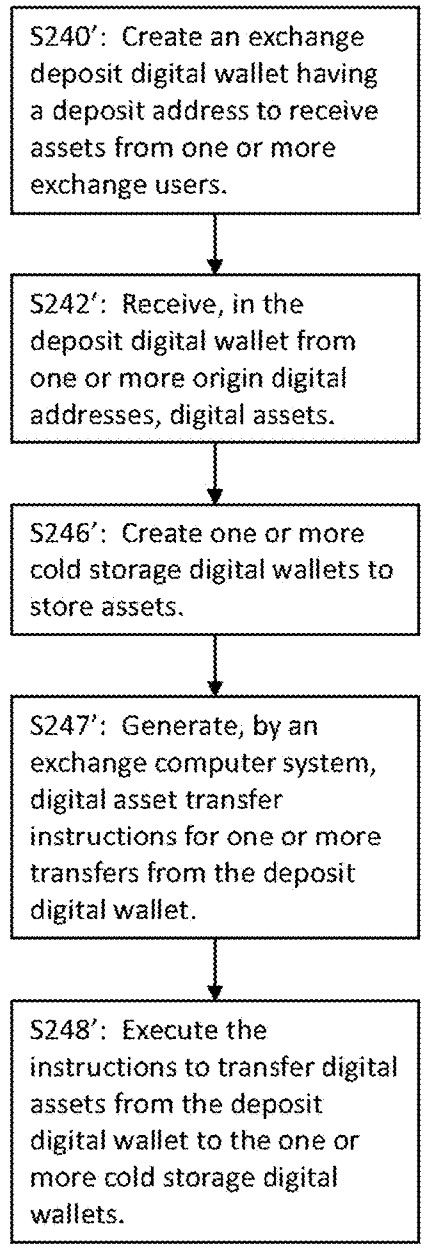

With reference to FIG. 68D, an exemplary deposit distribution waterfall is illustrated. In embodiments, these steps may be performed using an exchange computer system.

In step S240', an exchange deposit digital wallet can be created using the exchange computer system to receive assets from one or more user digital wallets.

In step S242', digital assets may be received in the deposit digital wallet from one or more origin digital addresses (e.g., corresponding to exchange user digital wallets).

In step S246', one or more cold storage digital wallets may be created to store digital assets. In embodiments, such cold storage digital wallets may already exist and be stored according to the secure storage systems and methods described herein.

In a step S247', the exchange computer system may generate digital asset transfer instructions for transfers from the deposit digital wallet. The transfer instructions may be generated based at least in part upon a distribution algorithm. In embodiments, the deposit distribution methodology/algorithm can depend at least in part upon one or more of the following criteria or parameters:

setting a maximum amount of digital assets stored in each wallet (e.g., limiting to 10,000 BITCOIN in each wallet);

setting a minimum amount of digital assets stored in each wallet (e.g., at least 100 BITCOIN in each wallet);

setting a maximum ratio of maximum amount to minimum amount of digital assets stored in each wallet (e.g., a 10-to-1 ratio);

setting a random amount of digital assets to be stored in each wallet, wherein the random amount is greater than a minimum amount and less than a maximum amount;

limiting the number of uses of each wallet (e.g., never using the same wallet more than once);

resetting the maximum amount and the minimum amount of digital assets stored in each wallet based at least in part on increased or decreased volume of digital assets held by the exchange;

setting a maximum amount of digital assets transferred to each wallet in any given transaction (e.g., limiting to 10,000 BITCOIN in each wallet);

setting a minimum amount of digital assets transferred to each wallet in any given transaction (e.g., at least 100 BITCOIN in each wallet);

setting a maximum ratio of maximum amount to minimum amount of digital assets transferred to each wallet in any given transaction (e.g., a 10-to-1 ratio);

setting a random amount of digital assets to be transferred to each wallet in any given transaction, wherein the random amount is greater than a minimum amount and less than a maximum amount;

limiting the number of transfers to a given wallet (e.g., never using the same wallet more than once, never make more than two transfers to the same wallet during a year period, to name a few);

resetting the maximum amount and the minimum amount of digital assets transferred to and/or from each wallet based at least in part on increased or decreased volumes of digital assets held by the exchange; and/or performing transfers to one or more wallets, e.g., vault wallets, at random and/or varied times of day (e.g., make a transfer at 4:00 PM ET on one day and make a transfer at 4:18 PM ET the following day; make a transfer to one wallet at 4:00 PM ET and another wallet at 5:13 PM ET the same day), to name a few.

In a step S248', the digital asset transfer instructions may be executed using the exchange computer system to transfer digital assets from the deposit digital wallet to the one or more cold storage digital wallets.

In embodiments a system for determining and/or providing a blended digital math-based asset price can comprise one or more processors and one or more computer-readable media operatively connected to the one or more processors and having stored thereon instructions for carrying out the steps of (i) determining, by a trust computer system comprising one or more computers, share price information based at least in part upon a first quantity of digital math-based assets held by a trust at a first point in time and a second quantity of shares in the trust at the first point in time; (ii) receiving, at the trust computer system from the one or more authorized participant user devices of the authorized participant, an electronic request to redeem a third quantity of shares; (iii) determining, by the trust computer system, a fourth quantity of digital math-based assets based at least in part upon the share price information and the third quantity of shares; (iv) obtaining, by the trust computer system, one or more destination digital asset account identifiers corresponding to one or more destination digital asset accounts for receipt by the authorized participant of a transfer of the fourth quantity of digital math-based assets from the trust; (v) obtaining, using the trust computer system, one or more origin digital asset account identifiers corresponding to one or more origin digital asset accounts for the transfer; (vi) initiating, using the trust computer system, the transfer of the fourth quantity of digital math-based assets from the one or more origin digital asset accounts to the one or more destination digital asset accounts; (vii) broadcasting, using the trust computer system, the transfer to a decentralized electronic ledger maintained by a plurality of physically remote computer systems; (viii) verifying, by the trust computer system using the decentralized electronic ledger, a receipt of the fourth quantity of digital math-based assets at the one or more destination digital asset accounts; and (ix) canceling or causing to be canceled, using the trust computer system, the third quantity of shares from the authorized participant.

In embodiments, shares may be in the form of a security token, stocks, bonds, equities, fixed-income securities, fiat, commodities, marketable securities, and/or a combination thereof, to name a few.

Redemption Distribution Waterfalls Among Wallets

In embodiments, a redemption distribution waterfall may be implemented using one or more computers based at least in part on one or more parameters. Retrieval distributions may be dictating the order in which digital wallets (and/or their associated private and/or public keys) are retrieved from storage (e.g., from varying levels of cold storage, such as an on-premises safe, nearby safety deposit box, and/or geographically remote bank or secure storage facility). Retrieval distributions may also dictate quantities of digital assets to transfer from each wallet. In embodiments, redemption distribution algorithms may control such retrievals, e.g., by generating retrieval instructions, indicating one or more wallets to retrieve, and/or indicating one or more amounts to transfer from each identified wallet. In embodiments, such parameters may include at least one or more of the following:

- the order in which the wallet was created (e.g., first wallet created is first wallet used, last wallet created is last wallet used, to name a few);
- the order in which the wallet was filled (e.g., first wallet filed is first wallet used, last wallet created is last wallet used, to name a few);
- a random order in which the wallet was created;
- a random order in which the wallet was filled;
- a random selection of the wallet;
- the vault in which the wallet is stored;
- the custodian of a vault storing the pair segments associated with a wallet;
- the amount of digital assets needed for a redemption compared to available in the wallet;
- the relative amount of digital assets held in the wallet (e.g., use the largest wallets first, use the smallest wallets first, to name a few); and/or
- the risk that a wallet has been compromised, to name a few.

Proof of Control

It has been a widespread problem with custodial accounts for digital assets that the digital assets purportedly being held are in fact not present. Such digital custodial accounts present a series of technical issues associated with not only securely holding digital assets in a custodial nature, but also proving control over such digital assets, while minimizing security risks and depleting digital assets. Previous attempts to prove control have required that a transaction involving the custodial account be exercised, which when a transaction fee is charged reduces the overall assets within the custodial account. The transaction fee poses a problem in this case because the fees are conventionally paid from the digital wallets held in the administrative account, so that providing many proofs of control over time may ultimately lead to depletion of the digital assets held in the digital wallets.

Exemplary embodiments of the present invention address the technical challenge by providing proof of control from a custodial digital asset account, with payment of the transaction fee associated with the proof of control event from a separate operating account. Embodiments of proof of control systems can be applied to a wide variety of implementations associated with digital asset wallets, such as custodial wallets for exchange traded products, hedges funds, trusts, and other fiduciaries, or non-custodial wallets. The proof of control itself may be in the form of a message sent along with a zero net transfer of digital assets from the administrative account. The message may relate to a recent event, such as an event that occurred within a very recent time period (e.g., the previous 10 minutes, previous hour, previous 12 hours, previous 24 hours, previous day, previous week, previous month, to name a few). As noted above the message may be or include the additional information that is included in the logs displayed in FIG. 2. For example, the message may be a recent newspaper headline, blog post title, price at a given date and time from an exchange, like the Gemini Auction price on a given date, to name a few. Since the transaction fee is paid from the digital asset operating account, the digital assets held in the digital wallets of the custodial account are not depleted.

Referring to FIG. 99, the process for performing proof of control includes the following steps.

In Step S55302, an administrative portal of a trust computer system is requested to initiate a proof of control event. The trust computer system may be operatively connected to a decentralized digital asset network that uses a decentralized electronic ledger in the form of a blockchain maintained by a plurality of physically remote computer systems to track at least one of asset ownership or transactions in a digital math based asset system. Examples of a blockchain include BITCOIN, NAMECOINS, LITECOINS, PPCOINS, TONAL BITCOINS, BITCOIN CASH, ZCASH, IXCOINS, DEVCOINS, FREICOINS, IOCOINS, TERRACOINS, LIQUIDCOINS, BBQCOINS, BITBARS, PHENIXCOINS, RIPPLE, DOGECOINS, BARNBRIDGE, POLYGON, SOMNIUM SPACE, OCEAN PROTOCOL, SUSHISWAP, INJECTIVE, LIVEPEER, MASTERCOINS, BLACKCOINS, ETHER, NXT, BITSHARES-PTS, QUARK, PRIMECOIN, FEATHERCOIN, PEERCOIN, FACEBOOK GLOBAL COIN, STELLAR, TOP 100 TOKENS, TETHER; MAKER; CRYPTO.COM CHAIN; BASIC ATTENTION TOKEN, USD COIN; CHAINLINK; BITTORRENT; OMISEGO; HOLO; TRUEUSD; PUNDI X; ZILLIQA; ATOM, AUGUR; 0X; AURORA; PAXOS STANDARD TOKEN; HUOBI TOKEN; IOST; DENT; QUBITICA; ENJIN COIN; MAXIMINE COIN; THORECOIN; MAIDSAFECOIN; KUCOIN SHARES; CRYPTO.COM; SOLVE; STATUS; MIXIN; WALTONCHAIN; GOLEM; INSIGHT CHAIN, DAI; VESTCHAIN; AELF; WAX, DIGIXDAO; LOOM NETWORK; NASH EXCHANGE; LATOKEN; HEDGETRADE; LOOPRING; REVAIN; DECENTRALAND; ORBS; NEXT; SANTIMENT NETWORK TOKEN; POPULOUS; NEXO; CELER NETWORK; POWER LEDGER; ODEM; KYBER NETWORK; QASH; BANCOR; CLIPPER COIN, MATIC NETWORK, POLYMATH; FUNFAIR; BREAD; IOTEX; ECOREAL ESTATE; REPO; UTRUST; ARCBLOCK; BUGGYRA COIN ZERO; LAMBDA; IEXEC RLC; STASIS EURS; ENIGMA; QUARKCHAIN; STORJ; UGAS; RIF TOKEN, JAPAN CONTENT TOKEN; FANTOM; EDUCARE; FUSION; GAS; MAINFRAME; BIBOX TOKEN; CRYPTO20; EGRETIA; REN; SYNTHETIX NETWORK TOKEN; VERITASEUM; CORTEX; CINDICATOR; CIVIC; RCHAIN; TENX; KIN; DAPS TOKEN; SINGULARITYNET; QUANT; GNOSIS; INO COIN; ICONOMI; MEDIBLOC [ERC20]; 0X; AION; ALGORAND; AMP; ARCA; ARWEAVE; AUDIUS; AVALANCHE; BCB; BCC; BITCOIN SV; BLOCKSTACKS; CBAT; CDAI; CELA; CELO; CETH; CHIA, CODA, COSMOS, CWBTC; CZRK; DECRED; DFINITY; EOS; ETH 2.0; FILECOIN; HEDGETRADE; ION; KADENA; KYBER NETWORK; MOBILECION; NEAR; NERVOS; OASIS; OMISEGO; PAXG; POLKADOT; SKALE; DIEM; SOLANA; STELLAR; TEZOS; THETA; XRP; DIEM and/or DEW, to name a few. In embodiments, the underlying digital asset may be a digital asset that is supported by its own digital asset network (like ETHER supported by the ETHEREUM Network, NEO supported by the NEO Network, to name a few). A digital asset token, in embodiments, may be a stable value token (such as GEMINI DOLLAR, PAXG, EFIL, EDOT, EXTZ, EATOM, to name a few), digital finance tokens that may be associated with decentralized lending (such as AMP, COMPOUND, PROTOCOL, KYBER, UMA, UNISWAP, YEARN, AAVE, to name a few), tokens, non-fungible token (such as CRYPTOKITTIES, Sorar, Decentraland, Goods Unchained, My Crypto Heroes, to name a few), and/or gaming tokens (such as SANDBOX), to name a few. In embodiments, tokens may be based on standards such as ERC-720, ERC-721, ERC-1155, to name a few. The request to initiate may come from, for example, an auditor and may include a statement of a recent event to use in the proof of control exercise.

In Step S55304, the trust computer system generates script instructions to carry out a transaction involving one or more digital wallets held in a digital asset trust custody account so as to verify control of digital assets held in the one or more digital wallets. Step S55304, may be performed though the following sub steps. In sub step S55304-02, a statement is selected which is associated with an event that occurred within a predetermined time frame. For example, the message may relate to a recent event, such as an event that occurred within a very recent time period (e.g., the previous 10 minutes, previous hour, previous 12 hours, previous 24 hours, previous day, previous week, previous month, to name a few). For example, the message may be a recent newspaper headline, blog post title, price at a given date and time from an exchange, like the Gemini Auction price on a given date, to name a few. When a statement is provided as part of Step S55302, then the provided statement would be used.

Depending upon the length of the statement, various alternative processes may be employed. By way of example, for a short enough statement (e.g., less than 80 characters), the statement may be maintained in its original form. For example, "GeminiAuction02/08/18=8190.73". For a larger statement, like "Express News Report on Feb. 8, 2018: BITCOIN price SURGE: Why is BTC bouncing back today? Cryptocurrency market rising, available at https://www.express.co.uk/finance/city/916246/BITCOIN-price-news-why-BTC-bouncing-back-rising-today-cryptocurrency", a secure shortened version of the statement can be generated. For example, a cryptographic hash of the statement can be applied.

In embodiments, where the length of the statement is not predetermined, the trust computer system can perform the following additional sub steps as part of the Step S55304 process, including: Sub step S55304-04, the trust computer system may determine whether the statement fits within memo field length constraints of the script associated with the digital asset type. For example, BITCOIN uses "OP_RETURN outputs" as its mechanism for a memo field, which is limited to 80 bytes, and ETHEREUM uses Log Events on a pay-per-use basis. In sub step S55304-06, if the determining sub step S55304-04 indicates that the statement fits within the memo field length constraints, the trust computer system may maintain the statement in its original form. In sub step S55304-08, if the determining sub step S55304-04 indicates that the statement does not fit within the memo field length constraints, the trust system may generate a cryptographic hash of the statement to be used as a statement.

Next, in step S55306, the trust computers system may generate, based on the script instructions, a transaction with the following parameters: (i) a first input of a first amount of digital assets to a digital asset account associated with the trust custody account as accessed through the decentralized digital asset network using a trust custody account digital asset account identifier; (ii) a first output of a second amount of digital assets from the digital asset account associated with the trust custody account as accessed through the decentralized digital asset network using the trust custody account digital asset account identifier, the first amount of digital assets being equal to the second amount of digital assets; (iii) a second input of a third amount of digital assets to a digital asset account associated with an operating account as accessed through the decentralized digital asset network using an operating account digital asset account identifier; (iv) a second output of a fourth amount of digital assets from the digital asset account associated with the operating account as accessed through the decentralized digital asset network using the operating account digital asset account identifier, the fourth amount of digital assets being reduced relative to the third amount by a transaction fee amount; (v) a third output that comprises the statement in a memo field; and (vi) applying a digital signature to the transaction using a private key associated with the trust custody account. At step S55308, the trust system will perform the transaction.

Figure 54:
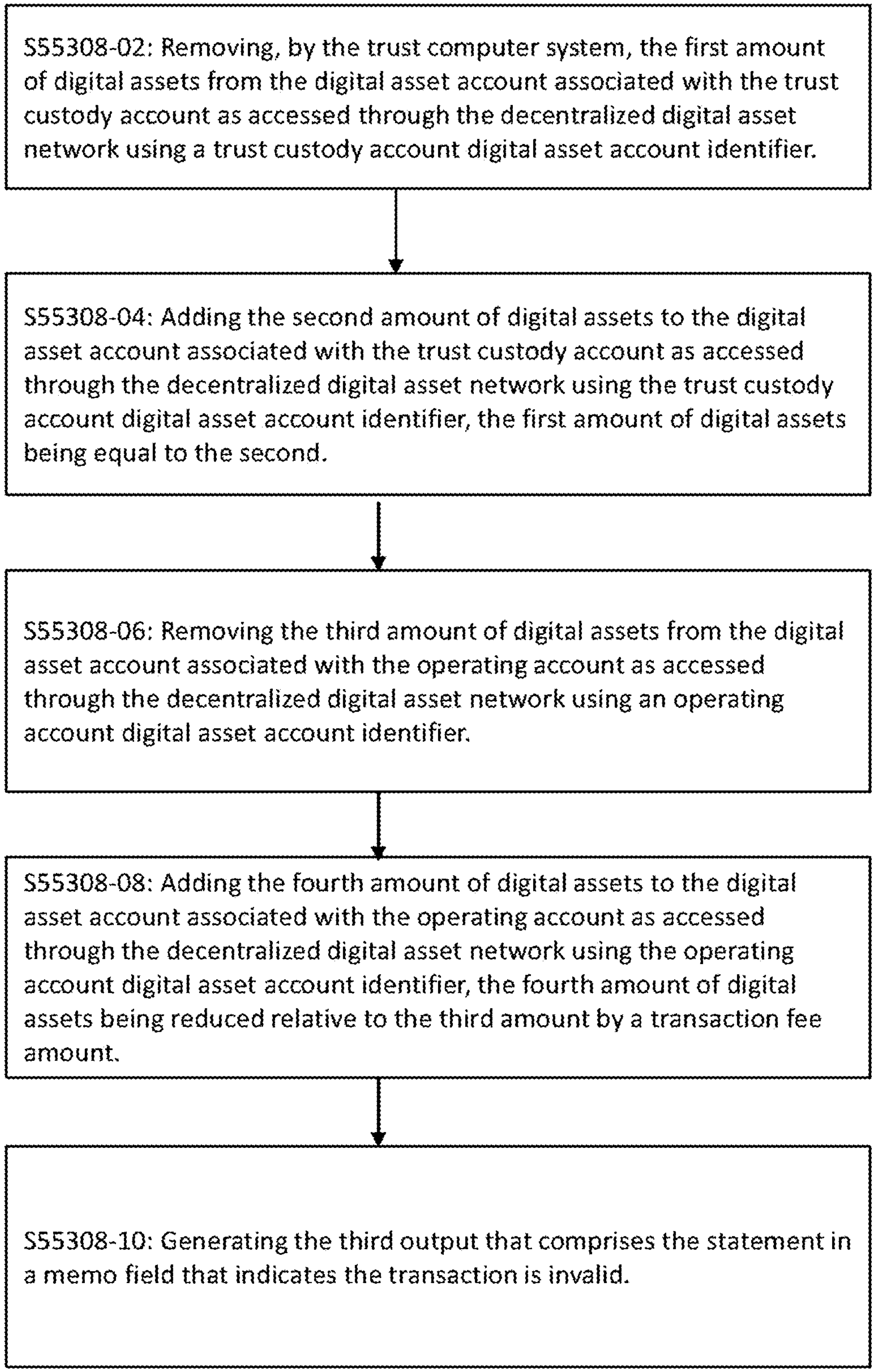
FIG. 54 is an exemplary flow chart illustrating the steps used to perform a transaction as part of the method to provide proof of control of the custodial account.
Figure 54A:
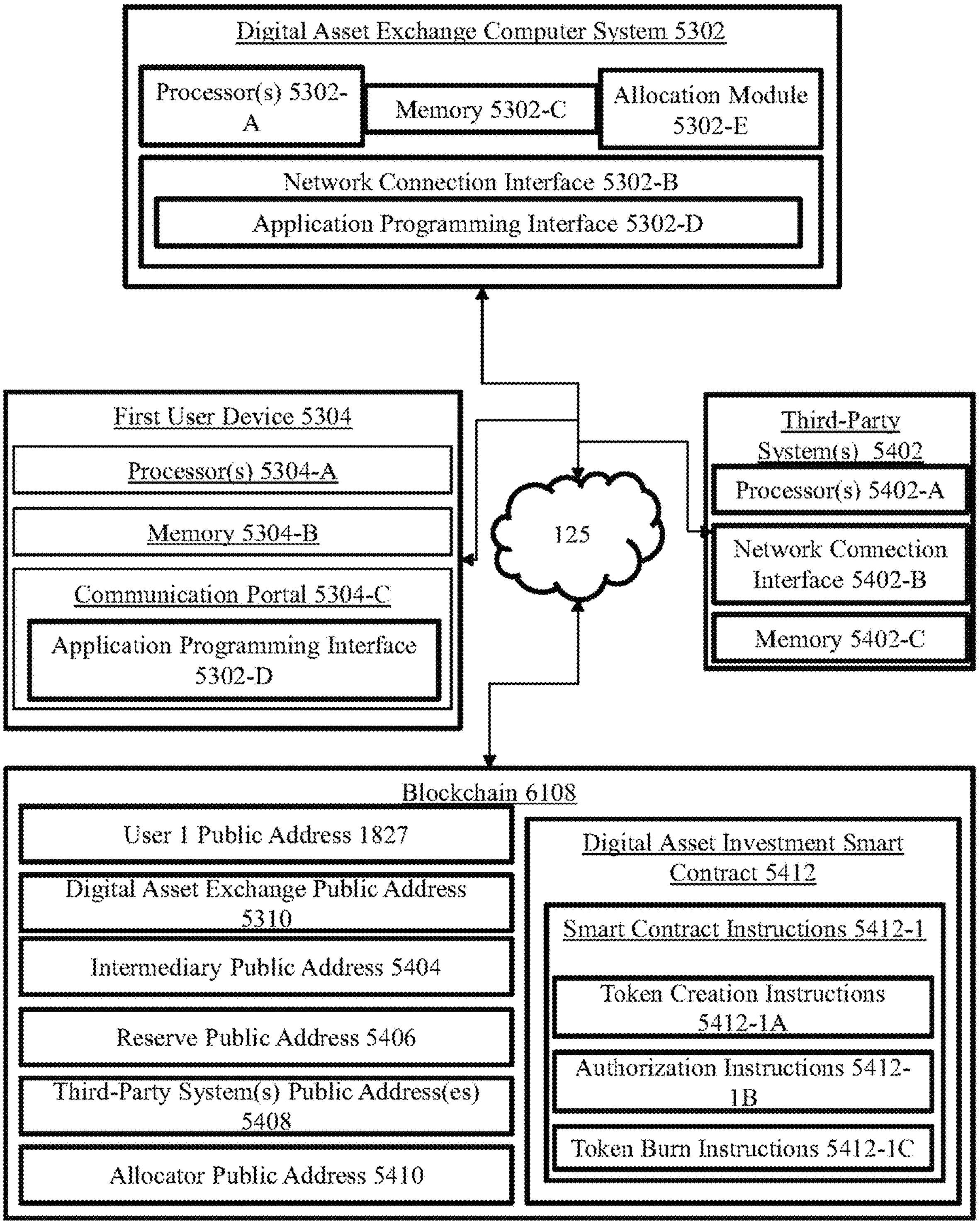
FIG. 54A is a schematic drawing of a digital asset exchange computer system communicating with a smart contract, first user device, and one or more third party banks in accordance with exemplary embodiments of the present invention.
Figure 54B:
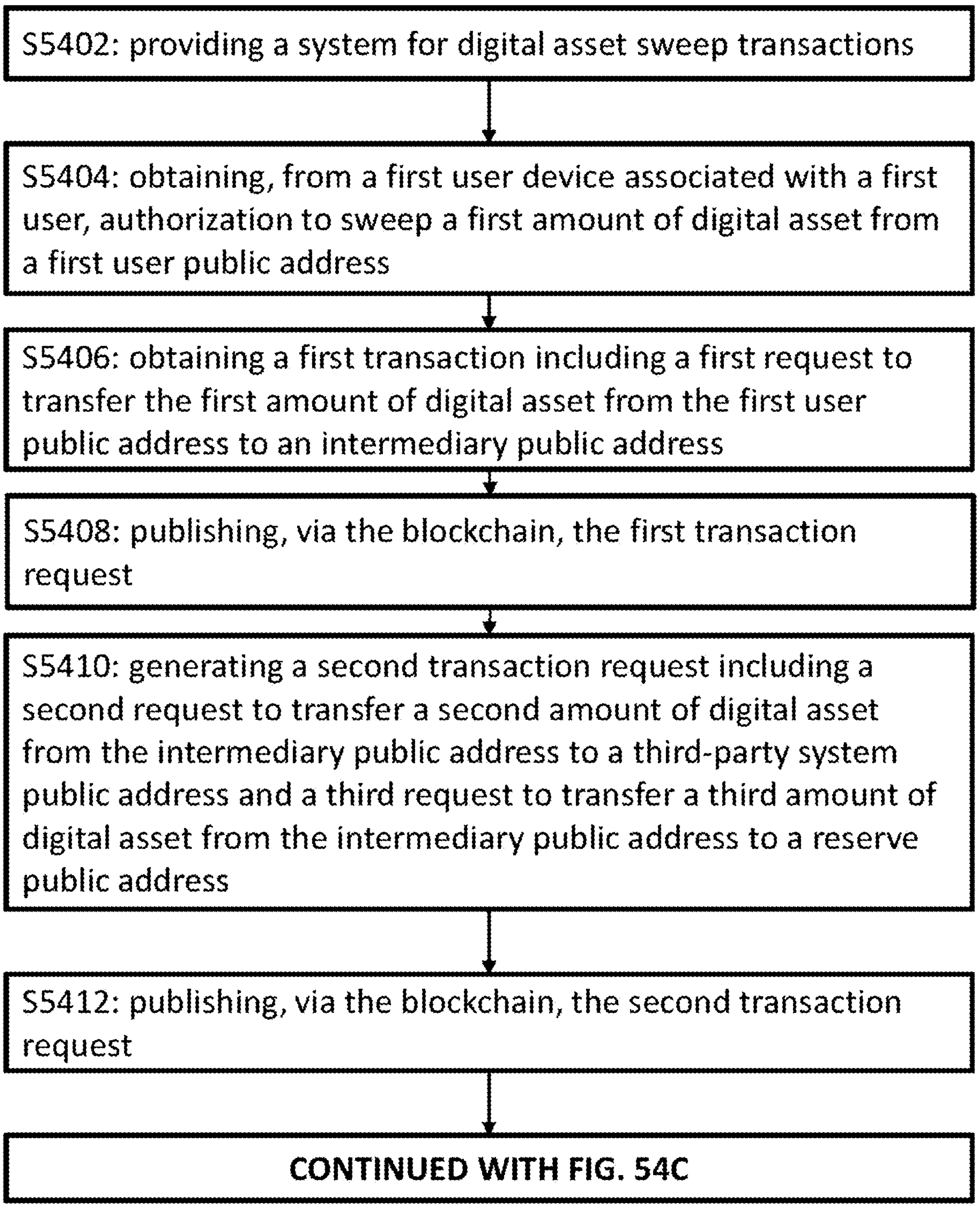
FIGS. 54B and 54C are exemplary flow charts of a process for providing and executing a multi-leg transaction in accordance with exemplary embodiments of the present invention.
Figure 54C:
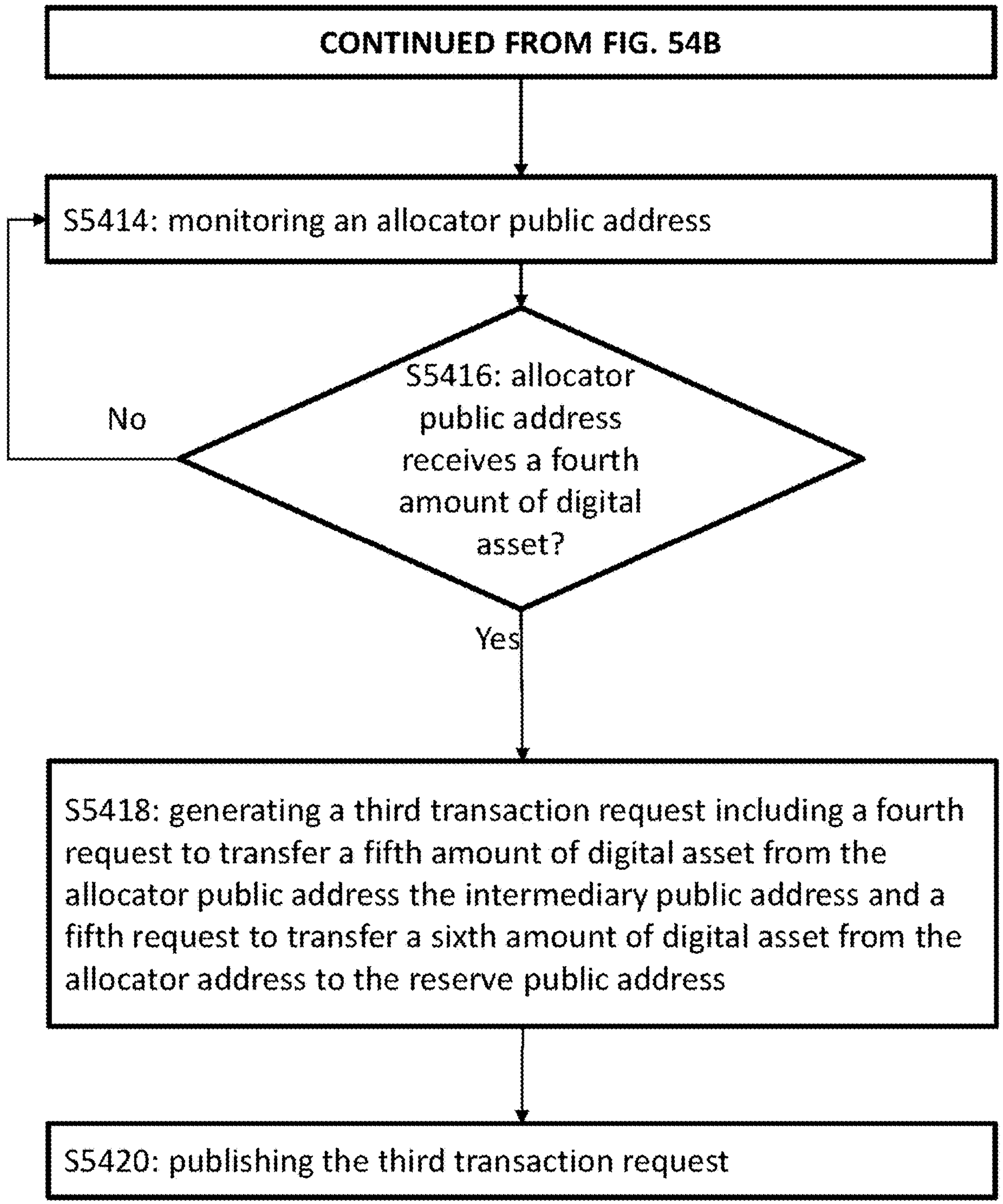

FIG. 54 illustrates an exemplary flow chart illustrating the sub steps that may be performed in order to complete the transaction in step S55308. At sub step S55308-02 the trust computer system removes the first amount of digital assets from the digital asset account associated with the trust custody account as accessed through the decentralized digital asset network using a trust custody account digital asset account identifier. At sub step S55308-04, the trust computer system adds the second amount of digital assets to the digital asset account associated with the trust custody account as accessed through the decentralized digital asset network using the trust custody account digital asset account identifier, the first amount of digital assets being equal to the second amount of digital assets. At sub step S55308-06, the trust computer system removes the third amount of digital assets from the digital asset account associated with the operating account as accessed through the decentralized digital asset network using an operating account digital asset account identifier. Next, at sub step S55308-08 the trust computer system adds the fourth amount of digital assets to the digital asset account associated with the operating account as accessed through the decentralized digital asset network using the operating account digital asset account identifier, the fourth amount of digital assets being reduced relative to the third amount by a transaction fee amount. At sub step S55308-10, the trust computer system generates a third output that comprises the statement in a memo field.

In embodiments, insurance may be provided for digital assets. Such insurance may be provided to individual users of digital assets (including vendors), groups of users, exchanges, exchange agents, trusts providing exchange traded products associated with digital assets, to name a few. Insurance may be provided for a digital asset wallet and/or the contents of a digital asset wallet (e.g., insurance for 100 BITCOIN stored in a digital wallet). Such insurance may involve secure storage of the private key to a wallet and/or the public key. In embodiments, the blended digital math-based asset price as discussed herein may be used as a benchmark for such insurance.

In embodiments, a digital asset kiosk, such as a digital math-based asset kiosk, may be used to perform one or more transactions associated with digital assets. The transactions may require an appropriate money transmit business in order to meet regulatory requirements. In embodiments, a person or entity must use a money transmit business registered in the person or entity's domicile.

In embodiments, a blended digital asset price can be calculated by one or more computers based on an averaged price. In embodiments, a blended digital asset price can be the price for digital assets determined each valuation day at a set time, such as,e.g., 3:00 p.m. Eastern Time. In embodiments, a blended digital math-based asset price may be obtained from a blended digital math-based asset index, which may be accessed via an API. In general, an API is a set of routines or subroutines, protocols and tools for building software applications, which facilitate communications between various software components. An API may be for a web-based system, operating system, database system, computer hardware or software library. An API specification can take many forms, but often includes specifications for routines, data structures, object classes, variables or remote calls. POSIX, Windows API and ASPI are examples of different forms of APIs. Documentation for the API is usually provided to facilitate usage. An example of such an order placing API is available with the Gemini Exchange, as discussed at https://docs.gemini.com/rest-api/#new-order. In embodiments, the system may calculate a blended digital asset price, by obtaining transaction data from one or more exchanges selected from a list of exchanges approved by, e.g., the sponsor, to determine either the average of the high and low prices on each exchange or the weighted (based on volume of shares traded) average of the transaction prices for the prior fixed time period (e.g., 12 or 24 hours) of trading activity on such one or more exchanges. In embodiments, the system may then average the price for each exchange, using weighting based on each exchange's volume during the period. Other methodologies can be used by the system to calculate the blended digital asset prices. For example, three exchanges, four exchanges, five exchanges, ten exchanges, or any number of exchanges as may be appropriate in view of the market for the math-based assets may be selected to determine the blended digital asset price. In embodiments, a time period of other than 12 or 24 hours may also be used depending upon the volume and volatility of the math-based asset price. For example, in a low volume period the time period may be increased to, e.g., 36 hours, while in a high volatility period the time period may be decreased to, e.g., 4 hours. In embodiments, a blended digital math-based asset price may be calculated by computing a volume weighted exponential moving average of actual transactions (e.g., considering price and volume of each executed transaction) from one or more digital asset exchange. In embodiments, the moving average may be taken over a period such as 2 hours. In embodiments, other periods may be used, such as 24 hours, 1 hour, 30 minutes, and/or 15 minutes, to name a few.

The Blended Digital Asset Price

A blended digital asset price, such as a blended digital math-based asset price, can be calculated, using one or more computers, each evaluation day. Systems and methods for calculating a blended digital asset price are described in U.S. application Ser. No. 14/313,873, filed Jun. 24, 2014, the contents of which are incorporated herein by reference.

The calculation can occur as of and at or as soon as reasonably practicable after 3:00 p.m. Eastern time each evaluation day (time could also be noon, 1 p.m., 2 p.m.—simply needs to be sufficient time before NAV striking to complete the calculations).

The blended digital asset price can be the functional equivalent of a rules-based index and therefore has rules to populate the universe of data inputs and rules on calculation using such inputs. As discussed herein, the blended digital asset price can be used to create an index, to be electronically published. The index can, in turn, also serve as a price benchmark or can be used to create derivative products. Accordingly, in embodiments, a blended digital math-based asset index may be a benchmark for a derivative product, an exchange traded derivative product, a fund, a company, an exchange traded fund, a note, an exchange traded note, a security, a debt instrument, a convertible security, an instrument comprising a basket of assets including one or more digital math-based assets, and/or an over-the-counter product, to name a few.

In embodiments, a blended digital asset price may be obtained from a digital asset index. For example, one or more computers may access (e.g., via an API) one or more blended digital math-based asset values from a computer or database of underlying digital asset index values. In embodiments, digital asset index values may be interpolated to determine a value at a requested point in time, e.g., 4 p.m. E.T.

Eligible Data Inputs for a Blended Digital Asset Price

In embodiments, data for the blended digital asset price can be drawn from the largest exchanges that publicly publish transaction data and principally utilize acceptable currencies, e.g., currencies other than the Chinese Yuan. In this example, the Yuan denominated exchanges may not be included because of manipulation of that currency and unreliability thereof. In embodiments, additional currency denominations may be added or excluded at one or more future dates, which may be dates following the initial formation of the trust.

The sponsor can approve each eligible exchange (which, in embodiments, can be no fewer than three to five exchanges at any given time).

Figure 69A:
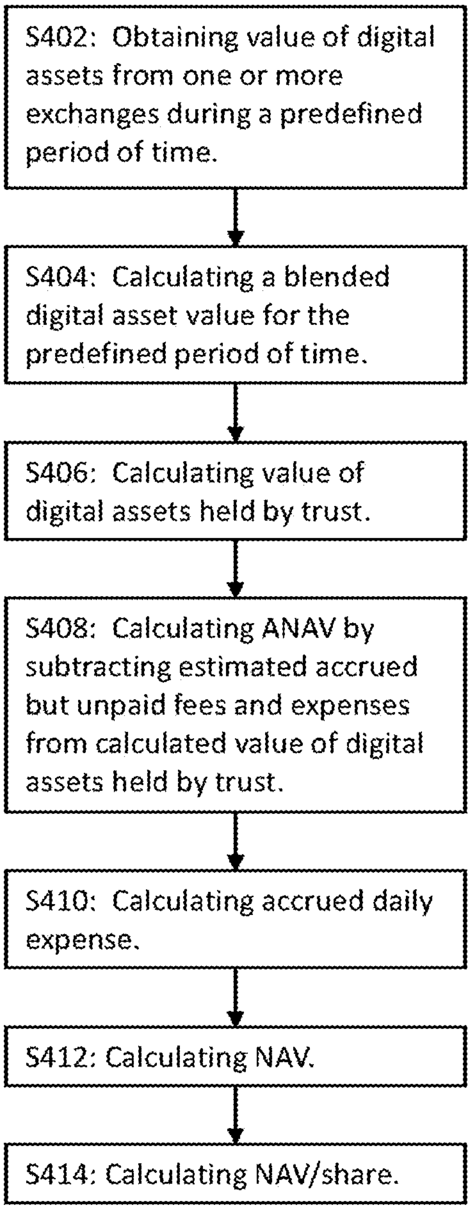
FIG. 69A is a flow chart of processes for calculating the NAV value of shares in a trust holding digital assets in accordance with embodiments of the present invention.

FIG. 69A is a flow chart of processes for calculating the NAV value of shares in a trust holding digital assets in accordance with embodiments of the present invention. In embodiments, these processes may be performed by a calculation agent 240, by one or more computers, and/or by some other entity using one or more computers. In a step S402, the one or more computers may obtain from one or more exchanges the value of digital assets during a predefined period of time. In a step S404 a blended digital asset value may be calculated for the predefined period of time. In embodiments, the blended digital asset value may also be obtained from an external computer system, such as an electronic published index system. In a step S406, the value of digital assets held by the trust may be calculated. In a step S408, the ANAV may be calculated. In embodiments, the ANAV may be calculated by subtracting estimated accrued but unpaid fees and expenses from the calculated value of digital assets held by the trust. In a step S410, the accrued daily expense may be calculated. In a step S412, the NAV may be calculated. In a step S414, the NAV per share (NAV/share) may be calculated.

Figure 69B:
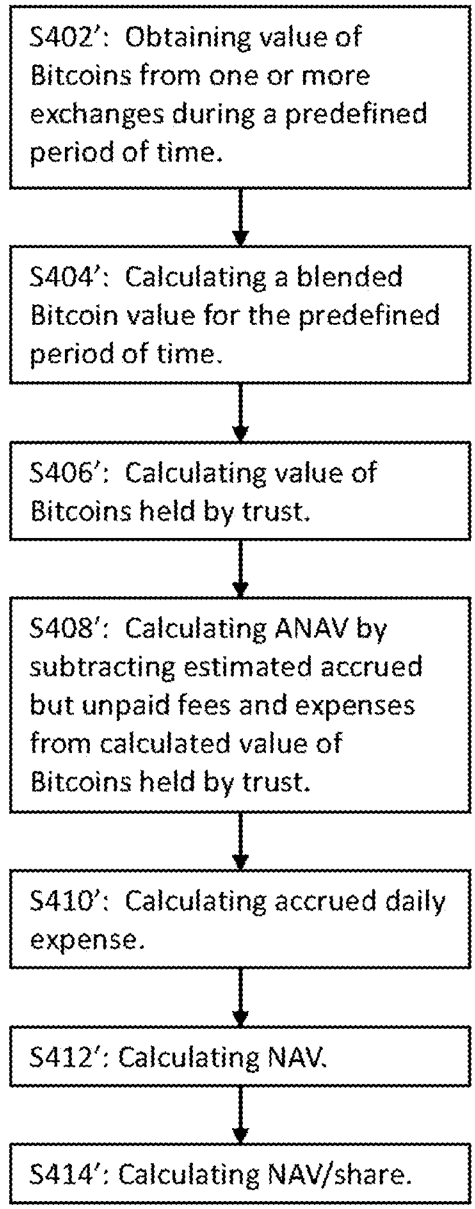
FIG. 69B is a flow chart of processes for calculating the NAV value of shares in a trust holding BITCOIN in accordance with embodiments of the present invention.

FIG. 69B is a flow chart of processes for calculating the NAV value of shares in a trust holding BITCOIN in accordance with embodiments of the present invention. In embodiments, these processes may be performed by a calculation agent 240, by one or more computers, and/or by some other entity using one or more computers. In a step S402', the one or more computers may obtain from one or more exchanges the value of BITCOIN during a predefined period of time. In a step S404' a blended BITCOIN value may be calculated for the predefined period of time. In a step S406', the value of BITCOIN held by the trust may be calculated. In a step S408', the ANAV may be calculated. In embodiments, the ANAV may be calculated by subtracting estimated accrued but unpaid fees and expenses from the calculated value of BITCOIN held by the trust. In a step S410', the accrued daily expense may be calculated. In a step S412', the NAV may be calculated. In a step S414', the NAV per share (NAV/share) may be calculated.

In embodiments, the following process can be used:

(1) Step 1: Valuation of Digital Assets

In embodiments, a NAV and NAV per Share, can be struck using one or more computers each evaluation day (e.g., each day other than a Saturday or Sunday or any day on which the listing exchange 235 is not open for regular trading).

The NAV and NAV per Share striking can occur at or as soon as reasonably practicable after a predetermined time of day (e.g., 4:00 p.m. Eastern time) each evaluation day and can be conducted by the trustee.

The first step for striking the NAV may be the valuation of the digital assets held by the Trust. In embodiments, the calculation methodology for valuing the Trust's digital assets can be as follows:

Value of digital assets=(# of digital assets held by trust)×(blended digital asset price)

If the blended digital asset price is unavailable on any given day, the sponsor can instruct the use of the prior day's blended digital asset price or, if the prior day's blended digital asset Price is deemed unfair/unsuitable, such other price as it deems fair.

(2) Step 2: Calculation of ANAV

Once the value of the digital assets in the trust has been determined on an evaluation day, the trustee, using one or more computers, can subtract all estimated accrued but unpaid fees (other than the fees accruing for such day on which the valuation takes place computed by reference to the value of the Trust or its assets), expenses and other liabilities of the trust from such NAV of the trust. The resulting figure is the adjusted net asset value ("ANAV") of the trust. The ANAV can be used to calculate fees of trustee and/or sponsor.

In embodiments, the ANAV can calculated using the following methodology:

ANAV=(value of digital assets)−(estimated accrued but unpaid fees/expenses/liabilities)

(3) Step 3: Calculation of Daily Expense

Once the NAV has been determined, any fees or expenses that accrued since the last striking of the NAV can be calculated using one or more computers based on the evaluation day ANAV.

All fees accruing for the day (and each day since the last evaluation day) on which the valuation takes place computed by reference to the value of the trust or its assets can be calculated by one or more computers using the ANAV calculated for such evaluation day.

In embodiments, in arrears using the average of the daily ANAV for the prior month, the daily expense fee (for each day since prior evaluation day) can be estimated on a daily basis using the following methodology:

Daily Expense*=(Sponsor's Fee)+(other fees)+(other expenses or liabilities accruing since the prior Evaluation Day)

(4) Step 4: Calculation of NAV and NAV Per Share

In embodiments, the trustee can calculate using one or more computers the NAV, by subtracting from the ANAV the Daily Expense.

In embodiments, the trustee can also calculate using one or more computers the NAV per share by dividing the NAV of the trust by the number of the shares outstanding as of the close of trading. In embodiments, the number of shares outstanding as of the close of trading may be obtained from the NYSE Arca (which includes the net number of any Shares created or redeemed on such evaluation day).

Calculation Methodology:

$$NAV=ANAV-(\text{Daily Expense})$$

$$NAV\text{ per Share}=NAV\div(\text{\# of Shares outstanding})$$

(5) The Blended Digital Asset Price

A blended digital asset price, such as a blended digital math-based asset price, can be calculated, using one or more computers, each evaluation day. Systems and methods for calculating a blended digital asset price are described in U.S. application Ser. No. 14/313,873, filed Jun. 24, 2014, the contents of which are incorporated herein by reference.

The calculation can occur as of and at or as soon as reasonably practicable after 3:00 p.m. Eastern time each evaluation day (time could also be noon, 1 p.m., 2 p.m.—simply needs to be sufficient time before NAV striking to complete the calculations).

The blended digital asset price can be the functional equivalent of a rules-based index and therefore has rules to populate the universe of data inputs and rules on calculation using such inputs. As discussed herein, the blended digital asset price can be used to create an index, to be electronically published. The index can, in turn, also serve as a price benchmark or can be used to create derivative products. Accordingly, in embodiments, a blended digital math-based asset index may be a benchmark for a derivative product, an exchange traded derivative product, a fund, a company, an exchange traded fund, a note, an exchange traded note, a security, a debt instrument, a convertible security, an instrument comprising a basket of assets including one or more digital math-based assets, and/or an over-the-counter product, to name a few.

In embodiments, a blended digital asset price may be obtained from a digital asset index. For example, one or more computers may access (e.g., via an API) one or more blended digital math-based asset values from a computer or database of underlying digital asset index values. In embodiments, digital asset index values may be interpolated to determine a value at a requested point in time, e.g., 4 p.m. E.T.

FIG. 108A is a flow chart of additional processes associated with the evaluation day for calculating NAV value of shares in a trust holding digital assets in accordance with embodiments of the present invention. The processes described by FIG. 108A may be performed by one or more computers operated by one or more entities, such as a calculation agent 240. In a step S502, the unpaid and accrued unpaid fees and expenses since the last evaluation day, which may include each category of fees and/or expenses, may be calculated. In a step S504, the number of digital assets to redeem for expenses may be calculated from the blended digital asset value and the unpaid and accrued unpaid fees and expenses since the last evaluation day. In a step S506, the calculated number of digital assets may be transferred from the trust to corresponding accounts, e.g., a sponsor account for the sponsor fee. In a step S508, the remaining number of digital assets held by the trust may be calculated. In a step S510, the NAV may be calculated. In a step S512, the value of the NAV per share may be calculated.

FIG. 108B is a flow chart of additional processes associated with the evaluation day for calculating NAV value of shares in a trust holding BITCOIN in accordance with embodiments of the present invention. The processes described by FIG. 108B may be performed by one or more computers operated by one or more entities, such as a calculation agent 240. In a step S502', the unpaid and accrued unpaid fees and expenses since the last evaluation day, which may include each category of fees and/or expenses, may be calculated. In a step S504', the number of BITCOIN to redeem for expenses may be calculated from the blended BITCOIN value and the unpaid and accrued unpaid fees and expenses since the last evaluation day. In a step S506', the calculated number of BITCOIN may be transferred from the trust to corresponding accounts, e.g., a sponsor account for the sponsor fee. In a step S508', the remaining number of BITCOIN held by the trust may be calculated. In a step S510', the NAV may be calculated. In a step S512', the value of the NAV per share may be calculated.

The NAV and NAV per Share can be published daily after its calculation using one or more computers. A third party agent can be employed to perform the calculation and to electronically publish it. In embodiments, the following process can be used:

Step 1: Valuation of Digital Assets

In embodiments, a NAV and NAV per Share, can be struck using one or more computers each evaluation day (e.g., each day other than a Saturday or Sunday or any day on which the listing exchange 235 is not open for regular trading).

The NAV and NAV per Share striking can occur at or as soon as reasonably practicable after a predetermined time of day (e.g., 4:00 p.m. Eastern time) each evaluation day and can be conducted by the trustee.

The first step for striking the NAV may be the valuation of the digital assets held by the Trust. In embodiments, the calculation methodology for valuing the Trust's digital assets can be as follows:

Value of digital assets=(# of digital assets held by trust)×(blended digital asset price)

If the blended digital asset price is unavailable on any given day, the sponsor can instruct the use of the prior day's blended digital asset price or, if the prior day's blended digital asset Price is deemed unfair/unsuitable, such other price as it deems fair.

Step 2: Calculation of ANAV

Once the value of the digital assets in the trust has been determined on an evaluation day, the trustee, using one or more computers, can subtract all estimated accrued but unpaid fees (other than the fees accruing for such day on which the valuation takes place computed by reference to the value of the Trust or its assets), expenses and other liabilities of the trust from such NAV of the trust. The resulting figure is the adjusted net asset value ("ANAV") of the trust. The ANAV can be used to calculate fees of trustee and/or sponsor.

In embodiments, the ANAV can calculated using the following methodology:

*ANAV*=(value of digital assets)−(estimated accrued but unpaid fees/expenses/liabilities)

Step 3: Calculation of Daily Expense

Once the NAV has been determined, any fees or expenses that accrued since the last striking of the NAV can be calculated using one or more computers based on the evaluation day ANAV.

All fees accruing for the day (and each day since the last evaluation day) on which the valuation takes place computed by reference to the value of the trust or its assets can be calculated by one or more computers using the ANAV calculated for such evaluation day.

In embodiments, in arrears using the average of the daily ANAV for the prior month, the daily expense fee (for each day since prior evaluation day) can be estimated on a daily basis using the following methodology:

Daily Expense*=(Sponsor's Fee)+(other fees)+(other expenses or liabilities accruing since the prior Evaluation Day)

Step 4: Calculation of NAV and NAV per Share

In embodiments, the trustee can calculate using one or more computers the NAV, by subtracting from the ANAV the Daily Expense.

In embodiments, the trustee can also calculate using one or more computers the NAV per share by dividing the NAV of the trust by the number of the shares outstanding as of the close of trading. In embodiments, the number of shares outstanding as of the close of trading may be obtained from the NYSE Arca (which includes the net number of any Shares created or redeemed on such evaluation day).

Calculation methodology:

$$NAV = ANAV - (\text{Daily Expense})$$

$$NAV \text{ per Share} = NAV \div (\text{\# of Shares outstanding})$$

The Blended Digital Asset Price

A blended digital asset price, such as a blended digital math-based asset price, can be calculated, using one or more computers, each evaluation day. Systems and methods for calculating a blended digital asset price are described in U.S. application Ser. No. 14/313,873, filed Jun. 24, 2014, the contents of which are incorporated herein by reference.

The calculation can occur as of and at or as soon as reasonably practicable after 3:00 p.m. Eastern time each evaluation day (time could also be noon, 1 p.m., 2 p.m.—simply needs to be sufficient time before NAV striking to complete the calculations).

The blended digital asset price can be the functional equivalent of a rules-based index and therefore has rules to populate the universe of data inputs and rules on calculation using such inputs. As discussed herein, the blended digital asset price can be used to create an index, to be electronically published. The index can, in turn, also serve as a price benchmark or can be used to create derivative products. Accordingly, in embodiments, a blended digital math-based asset index may be a benchmark for a derivative product, an exchange traded derivative product, a fund, a company, an exchange traded fund, a note, an exchange traded note, a security, a debt instrument, a convertible security, an instrument comprising a basket of assets including one or more digital math-based assets, and/or an over-the-counter product, to name a few.

In embodiments, a blended digital asset price may be obtained from a digital asset index. For example, one or more computers may access (e.g., via an API) one or more blended digital math-based asset values from a computer or database of underlying digital asset index values. In embodiments, digital asset index values may be interpolated to determine a value at a requested point in time, e.g., 4 p.m. E.T.

Eligible Data Inputs for a Blended Digital Asset Price

In embodiments, data for the blended digital asset price can be drawn from the largest exchanges that publicly publish transaction data and principally utilize acceptable currencies, e.g., currencies other than the Chinese Yuan. In this example, the Yuan denominated exchanges may not be included because of manipulation of that currency and unreliability thereof. In embodiments, additional currency denominations may be added or excluded at one or more future dates, which may be dates following the initial formation of the trust.

The sponsor can approve each eligible exchange (which, in embodiments, can be no fewer than three to five exchanges at any given time).

Eligible Data Inputs for a Blended Digital Asset Price

In embodiments, data for the blended digital asset price can be drawn from the largest exchanges that publicly publish transaction data and principally utilize acceptable currencies, e.g., currencies other than the Chinese Yuan. In this example, the Yuan denominated exchanges may not be included because of manipulation of that currency and unreliability thereof. In embodiments, additional currency denominations may be added or excluded at one or more future dates, which may be dates following the initial formation of the trust.

The sponsor can approve each eligible exchange (which, in embodiments, can be no fewer than three to five exchanges at any given time).

Selection of Data Inputs for a Blended Digital Asset Price

The rules for the blended digital asset price can provide for the use in calculation of the data from the three largest exchanges (by volume) on the sponsor approved list.

In embodiments, this determination of the three exchanges for use can be done on a weekly basis, (e.g., on each Monday) based at least in part on the volume on each such exchange during the prior week. In embodiments, this determination could be done on a different periodic basis (e.g., on a daily basis or a monthly basis) or on a when needed basis (e.g., whenever some circumstances occur requiring a change of determination).

In embodiments, so long as exchange selection is not on a daily basis, to the extent an exchange that has been selected for inclusion experiences a halt in trading for more than 24 consecutive hours (e.g., a lack of any recorded transactions during the prior 24 hours, regardless of the reason), that exchange can be replaced by the next largest exchange (by volume) on the sponsor approved list. In embodiments, this determination can be made automatically by one or more computers as part of an algorithm.

In embodiments, in the instance of a replacement, the restoration of daily volume on the halted exchange to a level more than the daily volume on the exchange that substituted for it could trigger a reversal of the substitution, if such restoration occurred prior to the next scheduled reconstitution of the included exchanges.

In embodiments, an exchange may be removed where there is a significant drop in trading on that exchange (e.g., 90% drop in trading volume) during a relevant time period (e.g., prior 24 hours, prior week, prior month, to name a few).

The rules for the blended digital asset price can provide for the use in calculation of the data from the three largest exchanges (by volume) on the sponsor approved list.

In embodiments, this determination of the three exchanges for use can be done on a weekly basis, (e.g., on each Monday) based at least in part on the volume on each such exchange during the prior week. In embodiments, this determination could be done on a different periodic basis (e.g., on a daily basis or a monthly basis) or on a when needed basis (e.g., whenever some circumstances occur requiring a change of determination).

In embodiments, so long as exchange selection is not on a daily basis, to the extent an exchange that has been selected for inclusion experiences a halt in trading for more than 24 consecutive hours (e.g., a lack of any recorded transactions during the prior 24 hours, regardless of the reason), that exchange can be replaced by the next largest exchange (by volume) on the sponsor approved list. In embodiments, this determination can be made automatically by one or more computers as part of an algorithm.

In embodiments, in the instance of a replacement, the restoration of daily volume on the halted exchange to a level more than the daily volume on the exchange that substituted for it could trigger a reversal of the substitution, if such restoration occurred prior to the next scheduled reconstitution of the included exchanges.

In embodiments, an exchange may be removed where there is a significant drop in trading on that exchange (e.g., 90% drop in trading volume) during a relevant time period (e.g., prior 24 hours, prior week, prior month, to name a few).

Figure 70:
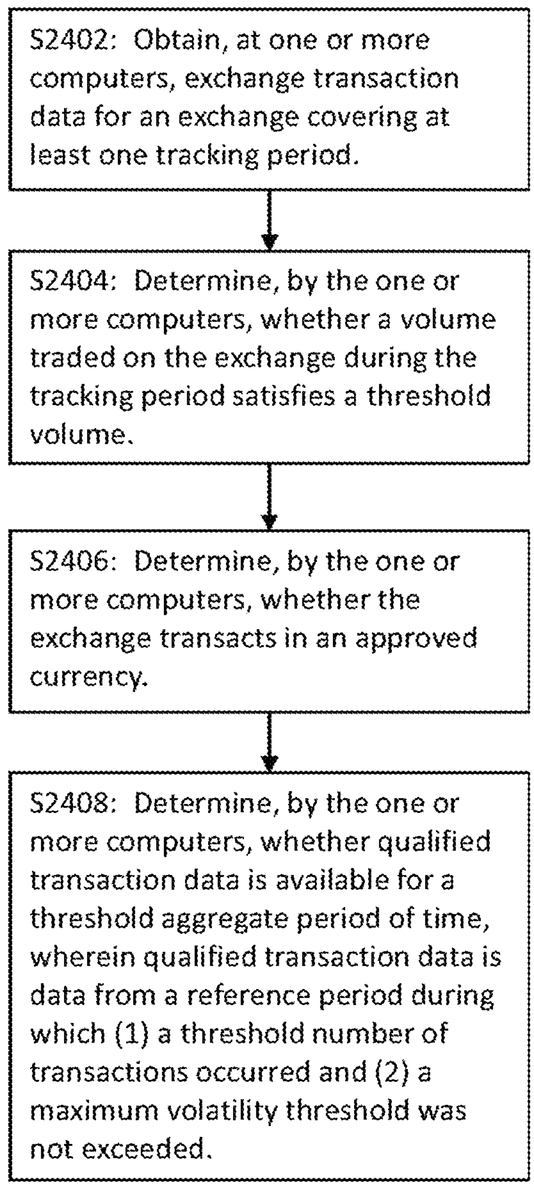
FIG. 70 is a flow chart of a process for determining qualified exchanges in accordance with exemplary embodiments of the present invention.

FIG. 70 illustrates an exemplary process for determining qualified or approved exchanges in accordance with the present invention. In embodiments, this process may be used to determine qualified money transmit businesses instead of exchanges and/or a combination thereof. The process may be programmed with computer code, which may be run on one or more processors. The process can utilize pre-defined criteria, rules, parameters, and/or thresholds to determine qualified exchanges. Such criteria can include transaction volume criteria, denomination types, geographic location, exchange data availability, exchange accessibility information (e.g., considerations of political or regulatory restrictions), regulatory compliance data, exchange customer data, and/or exchange owner data, to name a few. Thresholds can be expressed as absolute values and/or percentages.

In a step S2402, one or more computers may obtain exchange transaction data for an exchange, where the data covers at least one tracking period. The exchange data may be received via electronic transmission (e.g., over the Internet) and/or electronically accessed (e.g., using one or more APIs). The tracking period may be any period of time over which the exchange will be assessed for approval for use in the calculation of a blended digital asset price, such as 15 minutes, 1 hour, 12 hours, 24 hours, and/or 1 week, to name a few.

In a step S2404, the one or more computers may determine whether a volume traded on the exchange during the tracking period satisfies a threshold volume. In embodiments, a threshold volume may be 500 units of digital assets. In embodiments, a threshold volume may be expressed as a percent (e.g., a percent of the digital assets in circulation). The threshold may be modified periodically to help increase or decrease the number of qualified exchanges.

In a step S2406, the one or more computers may determine whether the exchange transacts in an approved currency. The computers may either test for an approved currency (e.g., by comparing to a database of approved currencies) or for an unapproved currency (e.g., by comparing to a database of unapproved currencies). In embodiments, only one currency may be approved, and the test for that currency may be hard-coded in exchange approval software. Currencies may be approved or unapproved based on considerations of reliability and/or stability, to name a few.

In a step S2408, the one or more computers may determine whether qualified transaction data is available for the exchange for a threshold aggregate period of time. Qualified transaction data may be data from a reference period during which a threshold number of transactions occurred (e.g., at least 3 transactions) and/or a maximum volatility threshold was not exceeded (e.g., the high and low price during the reference period did not fluctuate by more than 50% compared to the respective average high and low prices during that reference period of the other top (e.g., top 4) potential qualified exchanges by volume). In embodiments, transaction data may be evaluated from a plurality of reference periods to determine whether the data satisfies qualification criteria. In embodiments, transaction data to be qualified must satisfy qualification criteria for at least a specified period of time, which may be sub-divided into reference periods. For example, qualified transaction data may be determined for reference periods of 15 minutes, and to be a qualified exchange, the exchange must have qualified transaction data for an aggregate of at least 10 hours (40 reference periods) over a 24-hour tracking period. In embodiments, if an exchange satisfies each of the criteria examined in this exemplary process, it may be considered a qualified exchange for the tracking period over which it was examined. The determination of qualified exchanges may be performed at the end of each tracking period or on a rolling basis (e.g., re-evaluated at the end of each reference period).

Description of Electronic Data Pulled from Inputs

For each exchange on the approved list, the prior 24 hours of data setting forth each trade on the exchange by execution price and quantity transacted can be obtained, e.g., received and/or retrieved. In embodiments, one or more digital asset prices, such as, e.g., auction price, closing price, traded value, bid price, ask price, and/or spot price, to name a few, may be obtained. In embodiments, only the highest and lowest exchange prices and their respective transaction volumes may be obtained. In embodiments, all exchange price and transaction data may be obtained. In embodiments, a shorter period of time than 24 hours may be used, e.g., 12 hours, 3 hours, to name a few, or a longer period of time such as 48 hours may be used, to insure a sufficient volume of transaction data is considered.

Application of Electronic Data

For each of the exchanges included in the calculation for any given evaluation day, an average price for such date can be used. In embodiments, using each average exchange price for such date, a blended and weighted average price for all exchanges can be extracted and used as the blended digital asset price.

In embodiments, the auction price and/or the blended price may be used as a benchmark for various financial products. As used herein, the term financial products includes, but is not limited to exchange traded notes, futures products (such as options), derivative products (such a puts and calls), other indices (such as volatility indices), swaps, currencies, fixed income products, bonds, securities and equities to name a few.

In embodiments, a blended digital asset price may be calculated by first calculating each selected exchange's daily average and then blending (e.g., averaging) the averages into a blended digital asset price. The daily average may be a time-weighted (e.g., exponential) moving mean and/or volume weighted mean. In other embodiments, a blended digital asset price may be calculated using the data from the selected exchanges (e.g., the top 3 qualified exchanges) without first determining single exchange averages.

Single Exchange Average

In embodiments, a single exchange averages may be used instead of a blended digital asset price. In other embodiments, single exchange averages may be combined into a blended digital asset price. In other embodiments, an auction price may be used in lieu of a blended digital asset price.

In embodiments, the single exchange average may be calculated by one or more computers using the unweighted mean average of the high and low trading prices for such day (the average price of each trade during the day—which could be subject to manipulation through outlier price trades).

In embodiments, the single exchange average may be calculated by one or more computers using the weighted mean average of the high and low trading prices for such day (e.g., the trading price for each share traded that day, rather than for each executed trade regardless of share size).

In embodiments, the single exchange average may be calculated by one or more computers using the median average of the high and low trading prices for such day.

In embodiments, the single exchange average may be calculated by one or more computers using the weighted median average of the high and low trading prices for such day.

In embodiments the single exchange average may be calculated by one or more computers using any of a median, weighted median, average, and/or weighted average (by volume, time, or otherwise), any of which may be taken of high and low trading prices for a time period (e.g., 1 day, 1 hour, 15 minutes, to name a few), of the second highest and second lowest trading prices for a time period, and/or of all trades during a time period. For example, all transaction price data for a time period may be weighted by the volume transacted at the prices and/or by time (e.g., linearly or exponentially) in order to give greater weight to the more recent price data. Coefficients or other factors may be used to adjust the weighting so as to dampen or exacerbate any price fluctuations. For example, in embodiments, a coefficient for exponential weighting may be 0.69. In other embodiments, such a coefficient may be approximately 0.5, approximately 0.6, approximately 0.7, approximately 0.8, approximately 0.9, to name a few. Accordingly, in embodiments, a coefficient of exponential weighting can fall with a range 0.5-0.9, within a range 0.6-0.8, or within a range 0.7-0.8, to name a few.

In embodiments, as discussed above, digital asset price may be determined via auction conducted either periodically or aperiodically.

Blended Digital Asset Price

In embodiments, the blended digital asset price can be calculated by the average of the single exchange averages. In embodiments, the average may be weighted by volume. An average may weight different exchanges differently in order to account for differences in ease of access of funds from an exchange and/or ease of transacting on the exchange. As described herein, a blended digital asset price may be calculated as part of providing a generated digital asset index.

In embodiments, a collar may be placed on a single exchange auction price as a benchmark. The collar may be based on a benchmark such as the spot price at a particular time, plus or minus a defined range, such as a percentage of the benchmark price. In embodiments, the collar could be set using percentages such as 1%, 2%, 3%, 5%, 10% of the benchmark price, to name a few. By way of illustration, the collar may be based on a 5% variation from a benchmark of 1 BTC=USD$10,000, such that the collar is between USD$9,500 and USD$10,500. The spot price may be based on the last transaction immediately prior to the auction. A spot price may be based on an average of the most recent bid/ask price for the digital asset. In embodiments, a collar may be set based on a blended digital asset price. For example, a single exchange digital asset price could be determined based on a volume weighted average and/or time weighted average of recent digital asset pricing. In embodiments, a blended digital asset price may be based on a pricing from digital assets taken from a plurality of exchanges. In embodiments, the collar price may be based on a blended digital asset price comprising a plurality of digital asset exchanges (e.g., 4) executing trade data for a fixed period of time (e.g., a 10 minute period) using a volume weighting with a fixed percentage (e.g., 5%) of the highest priced trades and a second fixed percentage (e.g., 5%) of the lowest priced trades removed.

For example, a collar may be placed on the auction price, by using fixed percentage (e.g., 1 percent, 5 percent, 10 percent) of a benchmark against the continuous book price at given time period or set of time period. In embodiments, the benchmark could be a midpoint of the spot price of the continuous book price at the given time period (e.g., auction price). In embodiments, the benchmark could be a weighted average (such as a time weighted average, volume weighted average, or time and volume weighted average) of the continuous book during a pre-set window (e.g., 10 minutes for before auction, 1 hour before the auction, 12 hours before the auction, 24 hours before the auction, to name a few).

In embodiments, the collar may be a blended digital asset price as discussed elsewhere herein.

In embodiments, if the final auction price falls outside the collar, the auction may fail.

Figure 100A:
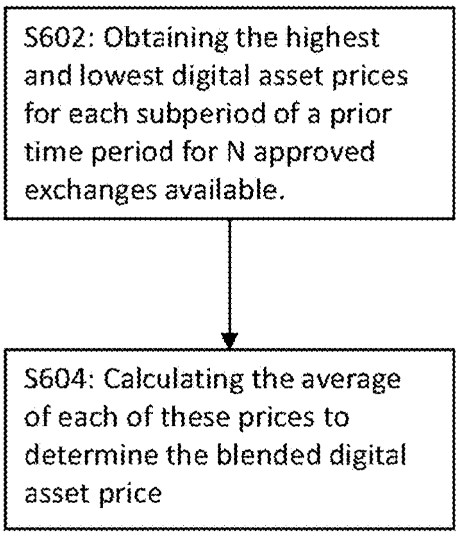

In embodiments, the blended digital asset price may be calculated as illustrated in FIG. 100A. In step S602, one or more computers may obtain the highest and lowest digital asset prices for each sub-period of a prior time period for N approved exchanges available. In embodiments, N may be the 3 largest approved exchanges. In step S604, each of these values may be averaged, using one or more computers, to determine a blended digital asset price for the prior sub-period. In embodiments, the blended digital asset price may be calculated for a 12-hour period or for a 24-hour period. In embodiments, the blended digital asset price may be calculated using a mean average transaction price weighted by volume.

Figure 100B:
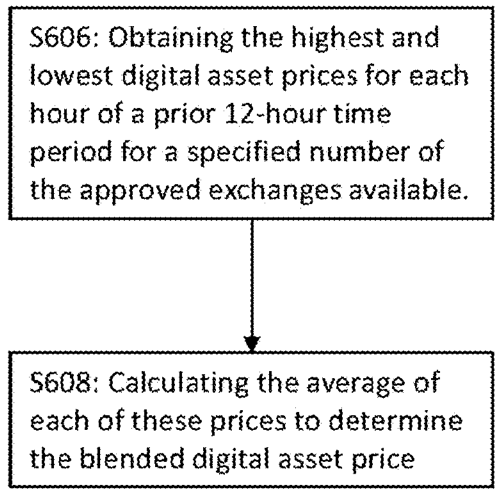

FIG. 100B illustrates a process for calculating the blended digital asset price using a 12-hour sub-period. In a step S606, one or more computers may obtain the highest and lowest digital asset prices for each hour of a prior 12-hour time period for a specified number N of the approved exchanges available. In a step S608, each of the values may be averaged, using one or more computers, to determine a blended digital asset price for the 12-hour period.

Figure 100C:
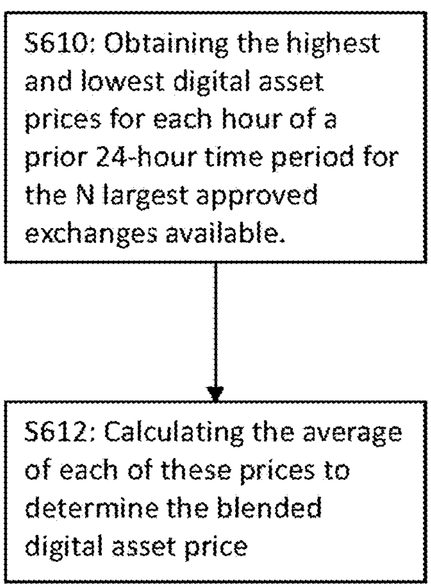

FIG. 100C illustrates a process for calculating the blended digital asset price using a 24-hour sub-period. In a step S610, one or more computers may obtain the highest and lowest digital asset prices for each hour of a prior 24-hour time period for a specified number N of the approved exchanges available. In a step S612, each of the values may be averaged, using one or more computers, to determine a blended digital asset price for the 24-hour period.

Figure 100D:
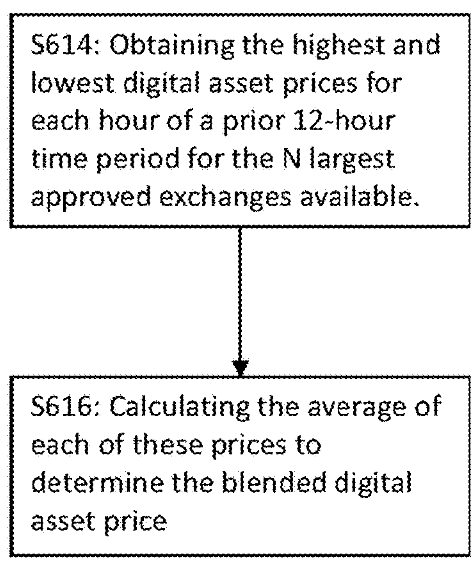

FIG. 100D illustrates a process for calculating the blended digital asset price using a 12-hour sub-period. In a step S614, one or more computers may obtain the highest and lowest digital asset prices for each hour of a prior 12-hour time period for the three largest of the approved exchanges available. In a step S616, each of the values may be averaged, using one or more computers, to determine a blended digital asset price for the 12-hour period.

Figure 100E:
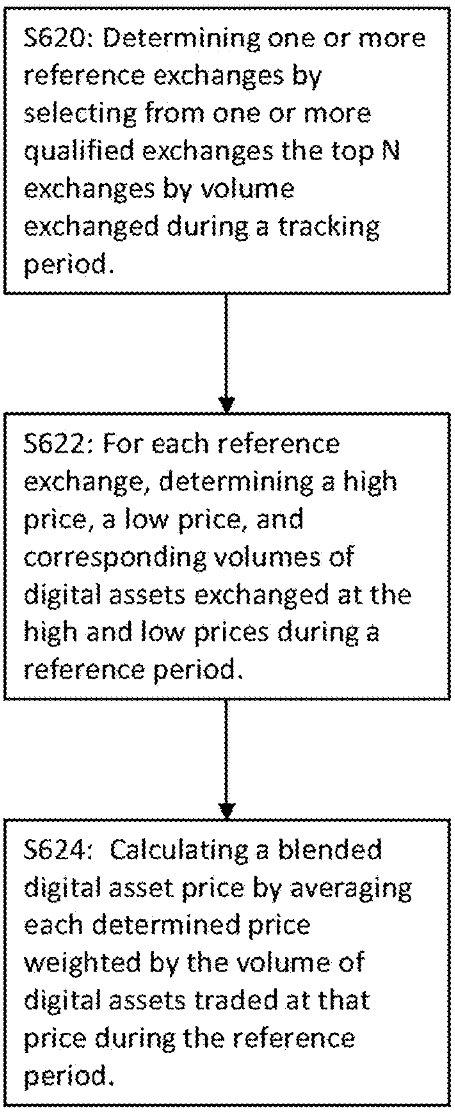

FIG. 100E illustrates another process for calculating a blended digital asset price. In a step S620, one or more computers may determine one or more reference exchanges. The reference exchanges may be the top N (e.g., 3) qualified exchanges by volume exchanged during a tracking period. A tracking period may be any period of time, such as 15 minutes, 30 minutes, 1 hour, 6 hours, or 12 hours, to name a few. Reference exchanges may be selected from a list of approved or qualified exchanges (e.g., approved by the sponsor). An exemplary process for approving exchanges to determine qualified exchanges is described herein with respect to FIG. 70. Reference exchanges may be determined each tracking period or may be determined over longer periods. For example, the reference exchanges may be determined at a fixed time each day. In a step S622, for each reference exchange, the one or more computers can determine highest and lowest exchange prices, as well as the corresponding volumes of digital assets exchanged at those high and low prices during a reference period. In embodiments, the reference period may be a different amount of time than the tracking period during which the reference exchanges are determined. In a step S624, one or more computers may calculate a blended digital asset price by averaging the high and low prices from each reference exchange, weighted by the respective volume of digital assets traded at each high and low price during the reference period.

Figure 100F:
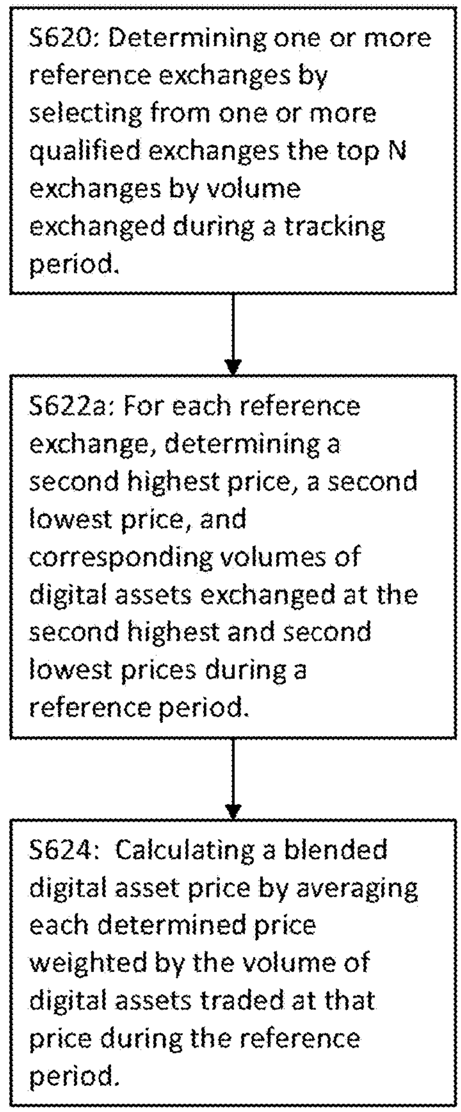

FIG. 100F illustrates another exemplary process for calculating a blended digital asset price. In a step S620, one or more reference exchanges may be determined, as described with respect to FIG. 100E. In a step S622*a*, for each reference exchange, the one or more computers can determine second highest and second lowest exchange prices, as well as the corresponding volumes of digital assets exchanged at those second highest and second lowest prices during a reference period. In a step S624, one or more computers may determine a weighted average of the determined second highest and second lowest prices from each reference exchange, where the weighted average is weighted by volume exchanged at each price, as discussed with respect to FIG. 100E.

Figure 100G:
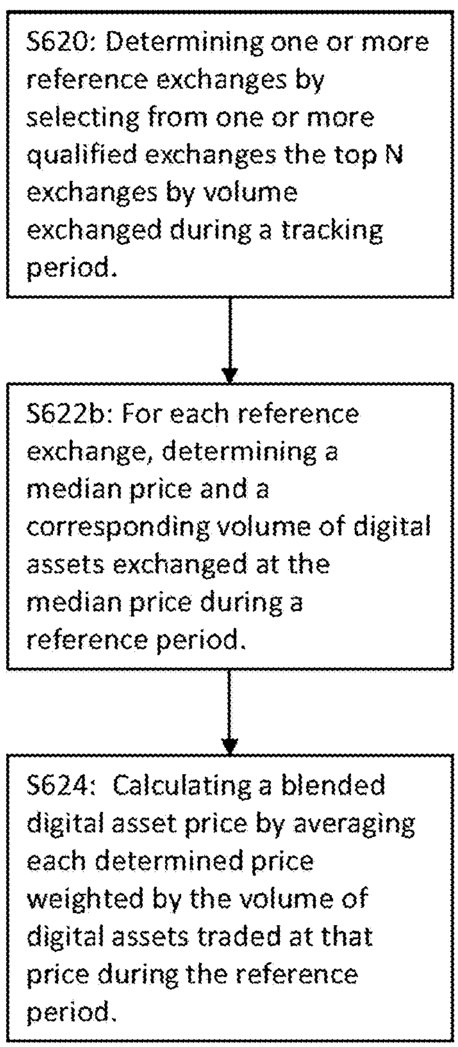

FIG. 100G illustrates another exemplary process for calculating a blended digital asset price. In a step S620, one or more reference exchanges may be determined, as described with respect to FIG. 100E. In a step S622*b*, for each reference exchange, the one or more computers can determine a median price and corresponding volumes of digital assets exchanged at that price during a reference period. In a step S624, one or more computers may determine a volume weighted average of the determined median prices from each reference exchange, as discussed with respect to FIG. 100E.

Figure 100H:
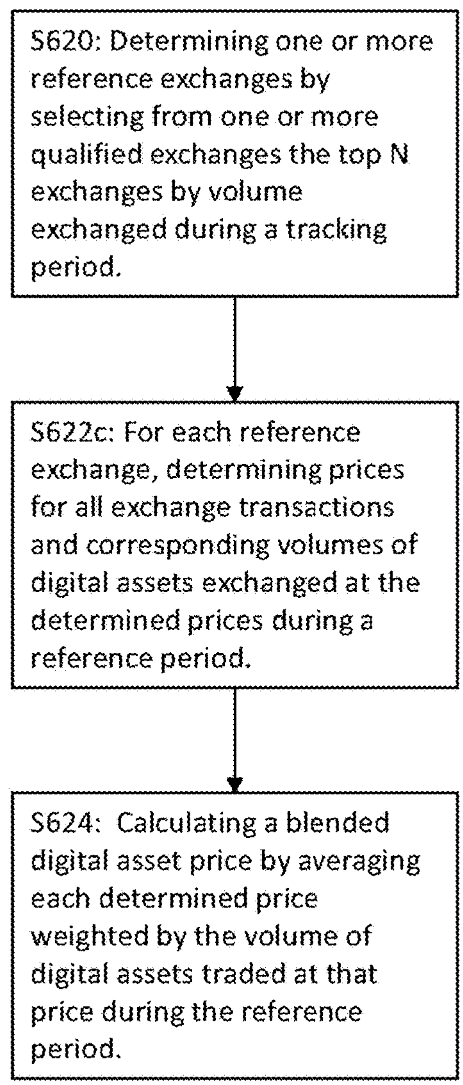

FIG. 100H illustrates another exemplary process for calculating a blended digital asset price. In a step S620, one or more reference exchanges may be determined, as described with respect to FIG. 100E. In a step S622*c*, for each reference exchange, the one or more computers can determine prices for all exchange transactions and corresponding volumes of digital assets exchanged at those prices during a reference period. In a step S624, one or more computers may determine a volume weighted average of the determined exchange prices from the one or more reference exchanges, as discussed with respect to FIG. 100E. In embodiments, the digital asset prices from each reference period may be weighted by time, e.g., so as to preference more recent reference periods. Such weighting may be exponential weighting, such as an exponentially time-weighted moving average. Other moving averages may be employed, with or without weighting, such as a simple moving average, a cumulative moving average, a weighted moving average, and/or a volume weighted moving average, to name a few. Transaction data may be weighted by both volume and time, for example, by applying a volume weighted average as well as an exponential time-weighted moving average. Accordingly, an exponential volume-weighted moving average may be employed, applying an exponential weighting to transaction volumes over shifting period of time (e.g., a trailing 2-hour window).

FIG. 101 illustrates an exemplary system for providing a digital asset index in accordance with the present invention. A digital asset index system may include one or more user devices 2005 (e.g., 2005-1 to 2005-N), one or more digital asset kiosks 2010, one or more reference transmitters 2015 (e.g., 2015-1 to 2015-R), a digital asset indexer 2020, a digital asset index publisher 2025 (e.g., Winkdex, Bloomberg, Google, Yahoo, to name a few), one or more exchanges 2030, one or more exchange agents 2035, and/or an exchange traded product computer system 2040, to name a few. Any of the components involved in a digital asset index system may be connected directly (e.g., through wired or wireless connections) or indirectly, such as through a data network 2002. Any of the components of a digital asset index system can comprise or include a computer system comprising one or more computers. Accordingly, any of the components may have at least one or more processors, computer-readable memory, and communications portals for communicating with other components of the system and/or outside entities.

Still referring to FIG. 101, a user device 2005 may be a mobile phone, smart phone, PDA, computer, tablet computer, and/or other electronic device that can receive communications. A user device 2005 may run software, such as a digital wallet, for accessing a digital asset index or may access a digital asset index through a general Internet browser. A digital asset kiosk 2010 may also access a published digital asset index, as discussed herein. A digital asset indexer 2020 may generate one or more digital asset indices, and a digital asset index publisher 2025 may provide access to the one or more digital asset indices. For example, a digital asset index publisher 2025 may publish an index to a website, to a scrolling sign, and/or to software (e.g., an application such as a digital wallet client on a user device), to name a few. A digital asset indexer 2025 may deliver index data (which may include index values and other information, such as times corresponding to the values) and/or one or more index values to one or more destinations, such as user devices 2005 and/or computer systems, including third-party computer systems. Delivering index data can include transmission via a data network 2002, which can include transmission by email and/or SMS, to name a few. An application programming interface ("API") may be used to provide access to a digital asset index from one or more third-party devices or computer systems. An embeddable widget may be provided to enable display on a third-party website of digital asset index data and/or index visualizations (e.g., graphs, charts, and/or accompanying visualization options, such as time range).

Still referring to FIG. 101, data from one or more reference transmitters 2015 may be used to generate an index, as discussed herein. Transmitters may be money service businesses or money transmit businesses in the United States. Transmitters 2015 may be part of a digital asset exchange 2030. Exchanges 2030 outside the United States may function like transmitters, e.g., performing all or part of the roles ascribed herein to transmitters 2015, but without the same money transmit licenses as required in the United States.

FIG. 102A is another flow chart of an exemplary process for providing a blended digital math-based asset price in accordance with the present invention.

In a step S822, one or more computers may access from one or more electronic databases stored on computer-readable memory, electronic digital math-based asset pricing data associated with a first period of time for a digital math-based asset from a plurality of reference digital math-based asset exchanges (e.g., four exchanges). In embodiments, the electronic pricing data can include transaction prices and/or bid and ask prices, to name a few. In embodiments, the one or more computers may access transaction data, including transaction volume data.

In a step S824, the one or more computers may determine a plurality of qualified digital math-based asset exchanges (e.g., three exchanges) from the plurality of reference digital math-based asset exchanges. In embodiments, the plurality of qualified exchanges may be determined by evaluating, by the one or more computers, electronic exchange selection criteria, which may comprise one or more electronic exchange selection rules.

In a step S826, a blended digital math-based asset price for the first period of time may be calculated, using the one or more computers, using a volume weighted average of the electronic digital math-based asset pricing data from the plurality of qualified exchanges for the first period of time.

In a step S828, the one or more computers may store in one or more databases the blended digital math-based asset price for the first period of time. In embodiments, the databases may be remotely located, e.g., in a cloud computing architecture. In embodiments, the databases may store one or more other blended digital math-based asset prices corresponding to one or more other periods of time.

In a step S830, the one or more computers may publish to one or more other computers the blended digital math-based asset price for the first period of time. As described herein, publishing can comprise transmitting the price to one or more computer, transmitting the price to one or more user electronic device (e.g., a mobile phone), providing the price to an electronic display (e.g., a scrolling display), and/or providing the price to a website, to name a few. In embodiments, the price may be published from the database of blended digital math-based asset prices. In other embodiments, the price may be published by the calculating computer directly, e.g., from working memory.

FIG. 102B is a flow chart of another exemplary process for electronically generating an index of digital asset prices.

In a step S842, a first plurality of constituent digital math-based asset exchanges may be determined, using the one or more computers, for a first period of time (e.g., a 24-hour period). In embodiments, electronic digital math-based asset pricing data and associated volume data may be obtained, at the one or more computers, for a first tracking period for each of a plurality of reference digital math-based asset exchanges. In embodiments, the total volume of transactions made on the respective exchange during the tracking period may be calculated, by the one or more computers, for each of the plurality of reference digital math-based asset exchanges. In embodiments, a first plurality of constituent digital math-based asset exchanges may be determined, by the one or more computers, by ranking the plurality of reference digital math-based asset exchanges by total volume for the tracking period and selecting a second plurality of the reference digital math-based asset exchanges (e.g., three) according to the largest total volumes, wherein the second plurality is less than the first plurality.

In embodiments, the process for determining the first plurality of constituent digital math-based asset exchanges can further comprise determining, by the one or more computers, for each of the plurality of reference digital math-based asset exchanges whether the total volume of transactions made on the respective exchange during the tracking period satisfies a threshold volume; determining, by the one or more computers, whether the digital math-based asset exchange transacts in an approved currency; and determining, by the one or more computers, for each of the plurality of reference digital math-based asset exchanges whether qualified transaction data is available from the respective digital math-based asset exchange for a threshold aggregate period of time, wherein qualified transaction data is data from a calculation period during which (1) a threshold number of transactions occurred and (2) a maximum volatility threshold was not exceeded, and wherein a calculation period is a subperiod of the tracking period.

In a step S844, electronic digital math-based asset pricing data may be obtained, using the one or more computers, for each of the first plurality of constituent digital math-based asset exchange for a first subperiod of the first period of time (e.g., a 2-hour period within the first period of time). In embodiments, electronic digital math-based asset pricing data (e.g., transaction prices, bid and ask prices, transaction volume data, to name a few) may be obtained, using the one or more computers, for each of the first plurality of constituent digital math-based asset exchange for a second subperiod of the first period of time.

In a step S846, a blended digital math-based asset price may be determined, using the one or more computers, for the first subperiod, by calculating an exponential volume-weighted moving average of the digital math-based asset pricing data for each of the first plurality of constituent digital math-based asset exchange for the first subperiod. In embodiments, a blended digital math-based asset price may be determined, using the one or more computers, for the second subperiod, by calculating an exponential volume-weighted moving average of the digital math-based asset pricing data for each of the first plurality of constituent digital math-based asset exchange for the second subperiod. In embodiments, the exponential moving average utilizes a coefficient between 0.6 and 0.8.

In a step S848, the blended digital math-based asset price may be stored, using the one or more computers, for the first subperiod in a blended price database stored on computer-readable memory operatively connected to the one or more computers. In embodiments, the blended digital math-based asset price may be stored, using the one or more computers, for the second subperiod in the blended price database. In embodiments, the blended price database may comprise at least blended digital math-based asset prices at a specified interval, e.g., prices every 15 seconds, every minute, and/or once per day, such as at a specified time each day, to name a few. Accordingly, prices at the intervals may be interpolated from the blended digital asset prices closest in time.

In a step S850, blended digital math-based asset price for the first subperiod may be published, by the one or more computers. In embodiments, blended digital math-based asset prices may be published, by the one or more computers, for a plurality of consecutive subperiods during the first period of time. In embodiments, the blended digital math-based asset price for the first subperiod or for the plurality of consecutive subperiods may be published from the blended price database. In embodiments, the blended digital math-based asset price may be published to one or more user devices. In embodiments, the blended digital math-based asset price may be electronically published through a dedicated website and/or through one or more electronic access points. The blended digital asset price can be published, using one or more computers, on the trust's website and distributed to APs. The blended digital asset price may form the basis of a digital asset index, as discussed herein. In embodiments, no intraday blended digital asset price may be required to be published throughout the day.

Still referring to step S850, a graphical representation of blended digital math-based asset prices may be generated, by the one or more computers. The graphical representation may include the blended digital math-based asset prices for the plurality of consecutive subperiods during the second period of time. The graphical representation may be provided from the one or more computers to the one or more second computers. In embodiments, the graphical representation includes a graphical representation of the digital math-based asset pricing data for each of the first plurality of constituent digital math-based asset exchanges for the plurality of consecutive subperiods during the second period of time. In embodiments, the graphical representation further includes a second graphical representation of volume data for each of the first plurality of constituent digital math-based asset exchanges for the plurality of consecutive subperiods during the second period of time.

In still other embodiments, an API for accessing the blended digital math-based asset price may be provided, by the one or more computers to one or more third computers. An electronic API request to access a blended digital math-based asset price for a subperiod may be received, by the one or more computers from the one or more third computers, and the blended digital math-based asset price for the first subperiod may be provided by the one or more computers to the one or more third computers.

In embodiments, generating a blended digital asset price and/or a blended digital asset price index can comprise accessing transaction data from a plurality of exchanges, as described herein. Such processes can include data normalization, which can convert data to a consistent and/or uniform format. For example, digital asset price data from one exchange may be provided in units of BITCOIN, while price data from another exchange may be provided in units of milli-BITCOIN, and data from another exchange may be provided in SATOSHIS. Upon accessing the data from the different exchanges, the data may be converted to a common format, such as milli-BITCOIN. In embodiments, time data may also be converted to a common format, e.g., 24-hour time, and/or a common time zone, e.g., GMT.

In an exemplary embodiment, a blended digital asset price may be calculated by blending the trading prices in U.S. dollars for the top three (by volume) qualified exchanges during the previous two-hour period using a volume-weighted exponential moving average. Constituent exchanges of the index can be selected according to rules, such as requiring that the exchanges have electronic trading platforms on which users may buy or sell digital assets with other users in exchange for U.S. dollars. The value of the index (including a daily spot price) can be determined using exchange transaction data on a moving average basis over a trailing two-hour period. The computer code used to generate the index may weight exchange transactions by volume on a proportional basis. In order to reflect the latest in pricing information, the most recent transactions may be weighted exponentially greater than earlier transactions in the two-hour period.

In embodiments, a digital asset kiosk, such as a digital math-based asset kiosk, may be used to perform one or more transactions associated with digital assets. The transactions may require an appropriate money transmit business in order to meet regulatory requirements. In embodiments, a person or entity must use a money transmit business registered in the person or entity's domicile.

FIG. 83 illustrates an exemplary system including a digital asset kiosk for accessing a digital asset exchange in accordance with embodiments of the present invention. A digital asset kiosk system may include one or more user devices 2005 (e.g., 2005-1 to 2005-N), one or more digital asset kiosks 2010, one or more reference transmitters 2015 (e.g., 2015-1 to 2015-R), a digital asset indexer 2020, a digital asset index publisher 2025, one or more exchanges 2030, one or more exchange agents 2035, and/or one or more insurers 2042, to name a few. Any of the components involved in a digital asset kiosk system may be connected directly (e.g., through wired or wireless connections) or indirectly, such as through a data network 2002. Any of the components of a digital asset kiosk system can comprise or include a computer system comprising one or more computers. Accordingly, any of the components may have at least one or more processors, computer-readable memory, and communications portals for communicating with other components of the system and/or outside entities.

Still referring to FIG. 83, a user device 2005 may be a mobile phone, smart phone, PDA, computer, tablet computer, and/or other electronic device that can receive communications. A user device 2005 may run software, such as a digital wallet, for accessing a digital asset exchange or may access a digital asset exchange through a general Internet browser. A digital asset kiosk 2010 may also access a digital asset exchange, as discussed herein. A digital asset indexer 2020 may generate one or more digital asset indices, and a digital asset index publisher 2025 may provide access to the one or more digital asset indices. For example, a digital asset index publisher 2025 may publish an index to a website, to a scrolling sign, and/or to software (e.g., an application such as a digital wallet client on a user device), to name a few. A digital asset indexer 2025 may deliver index data (which may include index values and other information, such as times corresponding to the values) and/or one or more index values to one or more destinations, such as user devices 2005 and/or computer systems, including third-party computer systems. Delivering index data can include transmission via a data network 2002, which can include transmission by email and/or SMS, to name a few. An API may be used to provide access to a digital asset exchange from one or more third-party devices or computer systems. An embeddable widget may be provided to enable display on a third-party website of digital asset exchange data and/or exchange data visualizations (e.g., graphs, charts, and/or accompanying visualization options, such as time range).

One or more insurers 2042 may provide insurance for fiat accounts, such as fiat exchange accounts. In embodiments, fiat exchange accounts may be held at an exchange partner bank. Such accounts may be insured by the Federal Deposit Insurance Corporation (FDIC). In embodiments, insurers 2042 may be private insurance companies. Insurers 2042 may also provide digital asset insurance, which may cover private key loss and/or theft and/or digital asset losses or thefts.

Still referring to FIG. 83, data from one or more money transmitters 2015 may be used to authorize users for access to an exchange, such as by performing anti-money laundering compliance processes, as described herein. Transmitters may be money service businesses or money transmit businesses in the United States. Money transmitters 2015 may be part of a digital asset exchange 2030. In embodiments, exchanges 2030 that are located outside the United States may function like transmitters, e.g., performing all or part of the roles ascribed herein to transmitters 2015, but without the same money transmit licenses as required in the United States.

Figure 38A:
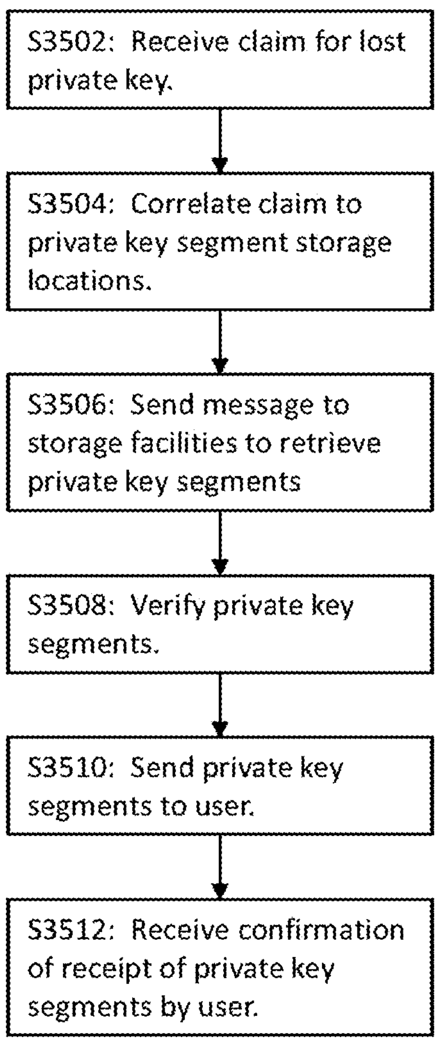
FIGS. 38A-38C are flow charts of processes for recovering key segments in accordance with exemplary embodiments of the present invention.
Figure 38B:
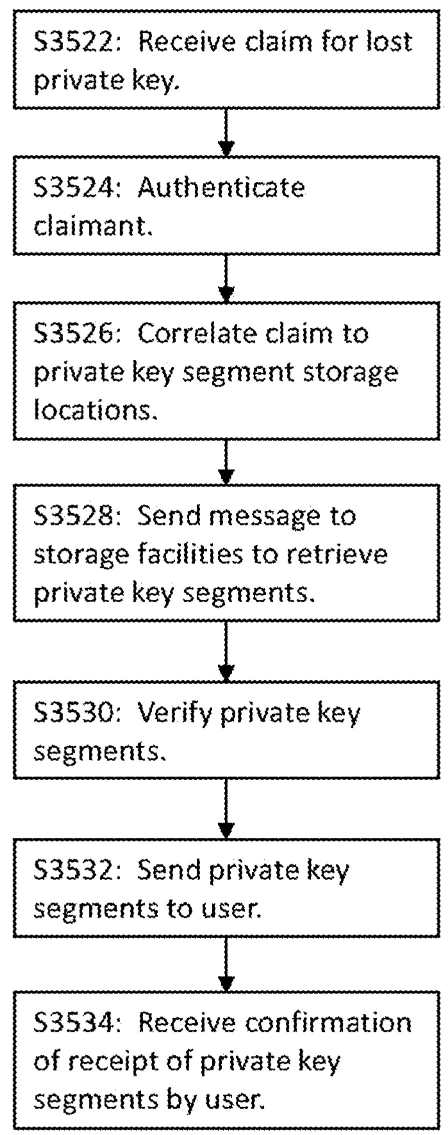

FIGS. 38A-B provide exemplary processes for determining the appropriate money transmit business for performing transactions, such as at a digital asset kiosk, even where the kiosk is located in a state other than the user's domicile. In embodiments, such processes may be performed for any potential user of an exchange seeking to create an exchange account, regardless of the user device used to access the exchange computer system. In embodiments, the processes described by FIGS. 38A-B may underlie any transactions performed at a digital asset kiosk. The processes may be performed when a user registers to use a digital asset kiosk or network of kiosks. Referring to FIG. 84A, in a step S2302, one or more computers may receive a request to perform a digital asset transaction. Digital asset transactions can include sending digital assets, transferring digital assets to accounts of different denominations (e.g., accounts denominated in different digital assets or in fiat currencies), transferring fiat currencies to digital asset accounts, depositing a fiat currency into a digital asset account, and/or withdrawing a fiat currency from a digital asset account, to name a few. In a step S2304, the one or more computers may obtain an indication of the domicile of the first requestor. In embodiments, the domicile may be a state in the United States. An indication of the domicile may be provided by scanning a government-issued ID, such as a driver's license, which may be used to search a database. Election registration may also be used to determine domicile. For corporations, the state in which they are registered may be their domicile. In embodiments, there may be a waiting period (e.g., one week) before the domicile is confirmed. Transactions may not be permitted until the domicile is confirmed and registration is completed. In a step S2306, the one or more computers may determine whether a state-registered money transmitter is available in the indicated state of domicile. A state-registered transmitter may be a money transmitter business. In embodiments, a domicile may not be a state, such as in the case of United States territories, and an appropriately registered transmitter may be required to proceed. In a step 2308, the one or more computers may provide to the requestor an interface for performing transactions using a transmitter registered in the indicated domicile. Any transaction performed by the requestor may be processed or otherwise handled by that transmitter.

FIG. 84B illustrates another exemplary process for determining the appropriate money transmit business for performing transactions involving digital assets. In a step S2312, one or more computers may receive a request from a requestor to register with a system and/or network for performing digital asset transactions. The requestor may be a natural person or a business. In a step S2314, the one or more computers may obtain requestor information, such as first and last name, address, contact information (e.g., telephone number, email address, to name a few), social security number, bank account information, digital asset wallet information, security information, requestor photograph, biometric information (e.g., handprint, fingerprint, retinal scan, facial analysis) and/or password information, to name a few. In a step S2316, the one or more computers may obtain an indication of the domicile of the requestor, as described with respect to step S2304 of FIG. 91A. In a step S2318, the one or more computers may determine whether a registered (e.g., state-registered) money transmitter is available in the indicated domicile. In a step S2320, the one or more computers may store the requestor information and the requestor domicile information in a user profile, which may use the password information and/or biometric information to provide secure access to a digital asset transaction system or network. A digital asset transaction card may be used (e.g., in conjunction with password or other security information) to provide access to a digital asset transaction system or network, such as through a digital asset kiosk.

Features of a Digital Asset Kiosk

FIG. 85 illustrates an exemplary digital asset kiosk in accordance with embodiments of the present invention. A digital asset kiosk 2005 may have one or more display device 2110, CPU 2112, computer-readable memory 2114, input device 2116, card reader 2118, wireless reader 2120, biometric reader 2122, scanner/imager 2124, cash deposit device 2126, cash storage 2128, cash dispenser 2130, check deposit device 2132, check storage 2134, counter 2136, communications portal 2138, and/or printer 2140. A digital asset kiosk 2005 may run one or more software applications, which may include one or more user authentication module 2142, reader module 2144, check recognition module 2146, cash recognition module 2148, counting module 2150, digital asset wallet module 2152, digital asset transfer module 2154, digital asset request module 2156, exchange module 2158, accounts module 2160, deposit module 2162, withdrawal module 2164, fund transfer module 2166, payment module 2168, insurance module 2170, preferences module 2172, user profile module 2174, and/or transaction history module 2176.

Still referring to FIG. 85, an input device 2116 may be a scanner, keyboard, touchscreen, mouse, microphone, and/or camera, to name a few. A card reader 2118 may be a device that can read magnetically encoded data on cards (e.g., magnetic strips on cards), RFID chips, and/or other cards with data storage, to name a few. A wireless reader 2120 may read data from one or more devices (e.g., smart phones) using wireless communication signals, such as Bluetooth or Wi-Fi. A biometric reader 2122 may be any of a palm scanner, fingerprint reader, retina scanner, facial recognizer, and/or voice recognizer, to name a few. In embodiments, a biometric reader 2122 may include a scanner (e.g., laser scanner), microphone, and/or camera. A scanner/imager 2124 may be used to scan identification cards (e.g., driver's licenses), documents (e.g., electric bills), money, checks, and/or other financial instruments (e.g., negotiable instruments).

Still referring to FIG. 85, a cash deposit device 2126 may receive paper money. In embodiments, coin may also be received by a digital asset kiosk 2005. A cash deposit device 2126 may comprise and/or operatively communicate with a scanner/imager 2124, which may be used to perform recognition of received cash. A cash deposit device 2126 need not be used to perform deposit transactions. Cash storage 2128 may store one or more monetary bills and/or coins. In embodiments, cash storage 2128 may store cash of different denominations. Cash storage 2128 may comprise a storage vault for secure storage of cash. A cash dispenser 2130 may dispense one or more monetary bills. In embodiments, it may dispense coins. A check deposit device 2132 may receive checks (e.g., personal checks, bearer checks, certified checks, cashier's checks, travelers checks, money orders and/or other negotiable instruments). In embodiments, a digital asset kiosk may receive other financial instruments or certificates thereof, such as stock certificates and/or bond certificates, to name a few.

FIG. 85 further illustrates a check deposit device 2132, which may comprise and/or operatively communicate with a scanner/imager 2124 and/or magnetic ink character recognition ("MICR") reader, which may be used to perform recognition of checks and/or other deposited financial instruments or certificates thereof. Those skilled in the art will appreciate that a check deposit device 2132 may be a check receipt device and need not be used in conjunction with deposit transactions. A check storage device 2134 may store one or more checks and/or other financial instruments or certificates thereof. A check storage device 2134 may comprise a vault for secure storage. A counter 2136 may determine an aggregate value of cash (e.g., monetary bills and/or coins), which can entail reading the value one or more bills and/or coins (e.g., upon receipt via cash deposit device 2126 and/or upon retrieval or other accessing of the contents of cash storage 2128). A communications portal 2138 may provide communications with one or more systems (e.g., a digital asset insurance system), devices (e.g., user electronic devices), and/or networks (e.g., a digital asset network, an ACH network), to name a few. A communications portal 2138 may comprise wired and/or wireless communications components, such as cable ports, cable, and/or wireless antennas, to name a few. A printer 2140 may print on one or more media of one or more sizes. A printer 2140 may print receipts (e.g., transaction receipts), transaction history reports, and/or account balance reports, to name a few.

Still referring to FIG. 85, software comprising one or more modules may run on the one or more CPUs 2112. A user authentication module 2142 can authenticate a user, which may entail identifying a user, confirming the identity of a user, and/or validating a user's authorization to use a digital asset kiosk and/or perform one or more transactions. A user authentication module 2142 may interact at least with an input device 2116, card reader 2118, wireless reader 2120, and/or biometric reader 2122, in order to confirm a user's identity. A card reader 2118 may read a user access card, and an input device 2116 may receive a user's passcode. Biometric readers 2122 may provide biometric confirmation of a user's identity. A reader module 2144 may interact with one or more card readers 2118, wireless readers 2120, and/or scanners/imagers 2124 to read card (e.g., with magnetic strips), QR codes, bar codes, RFID chips, and/or text, to name a few. A check recognition module 2146 may recognize one or more fields (e.g., drawer, drawee, account number, date, amount, to name a few) of a check or other financial instrument or certificate thereof. In embodiments, a check recognition module 2146 may comprise optical character recognition ("OCR") technology to read written fields (e.g., typewritten and/or handwritten). A check recognition module may interact with a scanner/imager 2124 and/or a MICR reader. A cash recognition module 2148 may interact with a scanner/imager 2124, a cash deposit device 2126, cash storage 2128, and/or a cash dispenser 2130 to determine denominations and/or values of cash, which may be paper bills and/or coins. A counting module 2150 may interact with a counter 2136 and/or other components of a digital asset kiosk to count and provide an aggregate value of cash (e.g., determine an amount of cash deposited or determine an amount of cash to retrieve for withdrawal) and/or checks (e.g., determine an aggregate value of checks deposited).

A digital asset wallet module 2152 may handle the creation of one or more digital asset wallets and/or the accessing of one or more existing digital asset wallets of one or more denomination. For example, a digital asset wallet module 2152 may handle wallets associated with a single digital asset, such as BITCOIN wallets, or handle wallets associated with a plurality of digital assets, such as LITECOIN wallets, and/or NAMECOIN wallets, in addition to BITCOIN wallets, to name a few. In embodiments, a digital asset kiosk may provide a unified wallet or an umbrella wallet, which may hold assets of different denominations. Such a wallet may use one or more exchange rates to show (e.g., in a single denomination) an aggregate value of assets contained in the wallet. Such exchange rates may be associated with a specific exchange, or a blended exchange rate as discussed herein. The wallet may comprise sub-wallets to hold separately each differently denominated asset. In embodiments, the digital asset wallet module 2152 may also be linked to a fiat currency digital wallet module, which transacts in a fiat currency, such as dollars, euro, yen, to name a few.

The wallet may show a breakdown of the value or number of assets of each denomination that is stored in the wallet. A digital asset wallet module 2152 may otherwise show account balances for one or more digital asset wallets. A digital asset transfer module 2154 may process one or more types of transactions involving the sending of digital assets. Digital assets may be sent to one or more other accounts and/or digital wallets, which may be associated with the user, other people, and/or other institutions. A digital asset request module 2156 may handle the requesting of digital asset transfers. For example, a digital asset request module 2156 may provide an interface by which a user can designate an amount of digital assets to request as well as another user, account, or digital wallet address from which to request the digital assets.

An exchange module 2158 may process exchange and/or conversion transactions involving digital assets. Exchange transactions may involve the conversion of digital assets of one denomination to digital assets of a different denomination, digital assets to fiat currencies, and/or fiat currencies to digital assets. In embodiments, exchange and/or conversion transactions may entail the use of a money transmit business, which may be selected by an exchange module 2158 based on the domicile of a user (e.g., a user performing an exchange transaction, a user sending funds that require an exchange transaction, a user paying a bill that requires an exchange transaction, to name a few). Accordingly, an exchange module 2158 may be used in conjunction with one or more other modules to process any transactions requiring an exchange transaction. In embodiments, an exchange module 2158 may allow a user to select an exchange (e.g., from a list of exchanges) to be used for the transaction. Such an option may enable a user to choose select exchanges located in different geographic regions, such as other countries. An exchange module 2158 may display and/or otherwise communicate one or more exchange rates corresponding to one or more exchanges and/or money service businesses.

Still referring to FIG. 85, an accounts module 2160 may access one or more fiat currency accounts for use in transactions at a digital asset kiosk 2005. For example, an accounts module 2160 may access a fiat currency account denominated in USD to convert USD from the account to BITCOIN. An accounts module 2160 may be used to create one or more fiat currency accounts. In embodiments, an accounts module 2160 may be used to store mixed denominations, which may include one or more fiat currencies and/or one or more digital assets of different denominations. An accounts module 2160 may access and/or create an umbrella account and/or a partitioned account to store different denominations. An accounts module 2160 may also provide balances for one or more accounts.

A deposit module 2160 may handle the physical deposit of money of one or more fiat currency and/or one or more checks or other financial instruments into a digital asset kiosk 2005. In embodiments, tokens and/or other physical embodiments of digital assets may be deposited, subject to applicable government regulations. A deposit module 2160 may control, interface with, and/or receive data from any of a cash deposit device 2126, check deposit device 2132, and/or counter 2136, to name a few. In embodiments, a deposit module 2162 may handle the deposit of funds of any denomination (e.g., funds from money and/or financial instruments inserted into a digital asset kiosk 2005) into one or more accounts of any denomination.

A withdrawal module 2164 may process withdrawals of money in any denomination using a digital asset kiosk 2005. Withdrawals may be made from any fiat currency account, investment account, and/or digital asset account. In embodiments, physical embodiments of one or more digital assets may be withdrawn, in conformance with applicable laws.

A fund transfer module 2166 can handle transactions involving the transfer of funds between accounts and/or between people and/or entities. Transfers of funds between accounts can entail moving digital assets from one account to another, which may be denominated differently, moving fiat currency from one account to another, which may be denominated differently, moving digital assets to an account denominated in a fiat currency, and/or moving funds from a fiat currency account to a digital asset account, to name a few. Transfers between differently denominated accounts, including transfers between digital asset and fiat currency accounts, may entail one or more exchange transactions. A fund transfer module 2166 may access (e.g., through one or more API) price and/or exchange data from one or more exchanges and/or may show one or more exchange rates associated with one or more exchanges. A fund transfer module 2166 may provide an interface for selecting options related to a fund transfer transaction and/or may implement commands to carry out a fund transfer transaction. Fund transfers can be between accounts with a common owner. Fund transfers can also be from one person or entity to another person or entity.

A payment module 2168 may handle payments using a digital asset kiosk 2005. A payment module 2168 may enable the paying of one or more bills (e.g., electric bill, gas bill, Internet bill, credit card bill, to name a few). A payment module 2168 may process automatic bill pay using digital assets, which may be converted to a fiat currency prior to payment.

An insurance module 2170 may handle the insuring of one or more digital asset accounts and/or transactions. An insurance module 2170 may communicate with one or more insurers to provide insurance options with users, such as basic insurance plans, premium plans, and/or custom coverage plans. Insurance options may comprise different coverage amounts, different premiums, and/or different asset storage policies, to name a few.

A preferences module 2172 may provide an interface for receiving user preferences and/or may implement those preferences. Preferences can include the language that is used, a default account to use for fund transfers, and/or a default exchange, to name a few. One or more preferences may be stored as part of a user profile such that the preferences may be loaded when a user logs into a digital asset kiosk 2005.

A user profile module 2174 can store user data (e.g., name, contact information, address, telephone number, email address, social security number, government ID information, biometric information, photograph, username, password, security questions, and/or membership data associated with a digital asset kiosk network, to name a few). A user profile module 2174 may store information associated with one or more fiat currency accounts and/or digital asset accounts (e.g., digital asset wallets), so that a user may access and/or use those accounts via a digital asset kiosk 2005.

A transaction history module 2176 may track and/or display account activity for one or more accounts. A transaction history module 2176 may show destinations, recipients, amounts, and/or dates of fund transfers and/or payments and/or may show withdrawals, deposits, exchange transactions, and/or insurance transactions.

FIGS. 86A-Q illustrate exemplary screen shots of a digital asset kiosk performing transactions in accordance with embodiments of the present invention. In embodiments, certain transactions illustrated in FIGS. 86A-Q (e.g., transactions that do not involve deposits or withdrawals or fiat currency) may be performed from a digital wallet or other digital asset client (e.g., a website or downloadable software on a computer, tablet computer, and/or mobile device, to name a few).

FIG. 86A illustrates an exemplary digital asset kiosk menu, which identifies actions that may be performed using an exemplary kiosk.

FIG. 86B illustrates an exemplary deposit 2202 being performed using an exemplary kiosk.

FIG. 86C illustrates an exemplary withdrawal 2204 being performed using an exemplary kiosk.

FIG. 86D illustrates an exemplary digital asset kiosk transfers and payments 2206 menu, which identifies fund transfer and payment transactions that may be performed using an exemplary kiosk.

FIG. 86E illustrates another exemplary digital asset kiosk transfers and payments 2206 menu.

FIGS. 40F-H illustrates an exemplary transfer between accounts 2244 being performed using an exemplary kiosk.

FIG. 861 illustrates another exemplary transfer between accounts 2244 being performed using an exemplary kiosk.

FIG. 86J illustrates an exemplary bill payment 2246 being performed using an exemplary kiosk.

FIG. 86K illustrates an exemplary transaction to send funds 2258 being performed using an exemplary kiosk. The user can be prompted or otherwise provided with an interface to enter or select a transaction amount 2296, which is the amount to send. A denomination option 2298 may allow the user to select the denomination for the transaction amount 2296. For example, a user may specify 1 unit of a digital asset (e.g., 1.00 BITCOIN), 100.00 USD, 50.00 CAD, and/or any amount of any supported currency that complies with any transaction rules or limits in effect. The software may provide a transaction denomination option 2300, which may allow a user to select the denomination of assets in which to transmit the funds. An origin account option 2302 may allow a user to select the account from which fund will be sent. In embodiments, an account may be a digital wallet. A destination option 2304 may allow a user to select a destination for the funds, which may be another user, an account (e.g., an account number or other identifier), and/or a digital wallet (e.g., a public address corresponding to a digital wallet). Where the amount denomination 2298 does not match the transaction denomination 2300, the software may access one or more digital asset exchanges to obtain and/or display an exchange rate 2308 and/or to compute the value in the desired transaction denomination and/or display that value. Accordingly, in embodiments, the software may show the exchange rate 2308 (e.g., 104.00 USD to 1 unit of a digital asset) and/or may compute the exchange value or approximate value before the transaction is processed. For example, upon a user's input of 2 units of a digital asset, the software may display "208.00 USD" or vice versa. Where the transaction denomination 2300 does not match the denomination of assets in the origin account 2302, the software may obtain an exchange rate and compute the corresponding amount of assets to send from the origin account 2302. This exchange information may be displayed or otherwise provided to the user. The software may also provide an interface or prompt the user for selection of transaction insurance options 2306. The user may select a yes option to insure the transaction or a no option to decline insurance. If insurance is selected, a user may enter a coverage amount. By default, the coverage amount may be the transaction amount 2296. The software may provide pre-determined coverage amount options and may indicate the cost of each. If the user enters a different coverage amount, the software may then determine the cost of insurance (e.g., recurring premiums or an up-front cost) or may provide the user with a get quote option, which can calculate, fetch, and/or otherwise obtain and display the associated cost of the selected coverage amount. In embodiments, limits may be placed on the coverage amount.

FIG. 86L illustrates an exemplary request of funds 2260 being performed using an exemplary kiosk.

FIG. 86M illustrates an exemplary exchange transaction 2208 being performed using an exemplary kiosk in accordance with embodiments of the present invention.

FIG. 86N illustrates an exemplary creation of a digital wallet 2210 being performed using an exemplary kiosk.

FIG. 86O illustrates an exemplary action to obtain account insurance 2212 being performed using an exemplary kiosk. In embodiments, insurance may involve secure storage of one or more keys to access an account.

FIG. 86P illustrates an exemplary action to check account balances 2214 being performed using an exemplary kiosk. Account balances may be emailed and/or printed by the kiosk. In embodiments, alerts may notify a user (e.g., by phone, email, text message) when there is account activity for one or more accounts, when balances reach a certain level, and/or when transactions of a certain size are performed.

FIG. 86Q illustrates an exemplary action to check a transaction history 2216 being performed using an exemplary kiosk. A digital asset kiosk may be used to view a transaction history of one or more accounts, which may include any fiat currency accounts and digital asset accounts that have been used in digital asset transactions. The transaction history may be printed by the kiosk and/or emailed or otherwise communicated to a user.

In embodiments, an external application (e.g., mobile application, desktop downloadable software, or a website, to name a few) may integrate with a digital asset kiosk. A user may initiate a kiosk transaction using the external application. For example, a user may send, using the external application, transaction instructions to sell digital assets. When the sending of digital assets to from the user to the buyer is confirmed (e.g., by a digital asset network or by an exchange), an electronic notification may be provided to the user to notify the user that the transfer was confirmed and/or that fiat currency is available for withdrawal. In embodiments, the fiat currency received from a buyer, which may be the exchange itself, may be stored in an exchange fiat currency account associated with the user. As described herein, the exchange fiat currency account may be a pooled account for a plurality of exchange users. In embodiments, the pooled account may provide insurance, such as FDIC insurance or insurance from another governmental body. The user may then log in at a digital asset kiosk and select an option to withdraw fiat currency. The kiosk may then provide the currency to the user. This integration of an external application to an exchange and kiosk system can eliminate the need for a user to log into a kiosk, initiate a transaction, and wait for the transaction to occur and clear before funds are available for withdrawal.

FIG. 87 is a flow chart of an exemplary process for performing an exchange transaction from an electronic kiosk.

In a step S5202, a digital asset kiosk may receive via a user input device first user identification data comprising at least a state of domicile.

In a step S5204, the digital asset kiosk may transmit to an exchange computer system, the first user identification data.

In a step S5206, the digital asset kiosk may receive from the exchange computer system, first display data related to an anti-money laundering user data collection interface based upon the state of domicile.

In a step S5208, the digital asset kiosk may render on a display device operatively connected to the apparatus, the first display data.

In a step S5210, the digital asset kiosk may receive via the user input device, second user identification data corresponding to the anti-money laundering user data collection interface.

In a step S5212, the digital asset kiosk may transmit to the exchange computer system, the second user identification data.

In a step S5214, the digital asset kiosk may receive from the exchange computer system, second display data related to a registration confirmation.

In a step S5216, the digital asset kiosk may render on the display device, the second display data.

Accordingly, in embodiments, an apparatus, which may be an electronic kiosk, may be programmed to perform the following steps: receiving, at the apparatus via a user input device, first user identification data comprising at least a state of domicile; transmitting, from the apparatus to an exchange computer system, the first user identification data; receiving, at the apparatus from the exchange computer system, first display data related to an anti-money laundering user data collection interface based upon the state of domicile; rendering, by the apparatus on a display device operatively connected to the apparatus, the first display data; receiving, at the apparatus via the user input device, second user identification data corresponding to the anti-money laundering user data collection interface; transmitting, from the apparatus to the exchange computer system, the second user identification data; receiving, at the apparatus from the exchange computer system, second display data related to a registration confirmation; and rendering, by the apparatus on the display device, the second display data.

In embodiments, such an apparatus may be an electronic kiosk. In embodiments, such an apparatus may be a user device, such as a smart phone, tablet computer, and/or computer.

In embodiments, the apparatus may be further programmed to perform the steps of receiving, at the apparatus from the exchange computer system, third display data related to exchange transaction options; rendering, by the apparatus on the display device, the third display data; receiving, at the apparatus via a user input device, a selection of an exchange transaction option related to a fiat withdrawal and a corresponding transaction request comprising at least a fiat withdrawal amount; and transmitting, from the apparatus to the exchange computer system, the transaction request.

In embodiments, an apparatus programmed to perform the following steps: receiving, at the apparatus via an input device, user account credentials; transmitting, from the apparatus to the exchange computer system, the user account credentials; receiving, at the apparatus from the exchange computer system, first display data corresponding to a plurality of exchange transaction options for an authenticated user; rendering, by the apparatus, the first display data on a display device operatively connected to the apparatus; receiving, at the apparatus via the input device, user selections corresponding to a first exchange transaction option that is an exchange transaction order; receiving, at the apparatus via the input device, exchange transaction order parameters; transmitting, from the apparatus to the exchange computer system, the exchange transaction order parameters; receiving, at the apparatus from the exchange computer system, second display data corresponding to order placement confirmation; and rendering, by the apparatus, the second display data on the display device.

Digital Asset Notification System

FIGS. 88A-B are a schematic diagram and corresponding flow chart showing an exemplary system and an exemplary process for providing digital asset notifications. Notifications may be provided as a feature of a digital wallet application and/or as a stand-alone service.

As shown in FIG. 88A, a user may subscribe for one or more notifications from a user device 2510, which may be a phone, smart phone, PDA, computer, tablet computer, to name a few. Notifications may also be received by a user device 2510. A notification system 2515 may receive digital asset price data from one or more digital asset exchange 2505 (e.g., 2505-1, 2505-2, . . . 2505-N). FIG. 102A illustrates the flow of steps and participants involved in performing the steps in an exemplary process for providing digital asset notifications, as described in greater detail herein with respect to FIG. 102B.

Referring again to FIG. 88A, a notification system 2515 can include a notification module 2520, price data 2525, and notification rules data 2530. A notification system 2515 can comprise one or more computers or computer systems having at least one or more processors, computer-readable memory comprising one or more databases, one or more communications portals for communicating with one or more other computers or computer systems, and/or one or more input devices. A notification module 2520 may be software that can process received notification instructions, generate notification rules, access digital asset price data, perform calculations and determinations using the price data and the notification rules, generate notifications, and/or transmit notifications, to name a few, as discussed herein with respect to FIG. 102B. In embodiments, the processes attributed to a notification module 2520 may be performed by one or more other software modules. In embodiments, one or more steps in a digital asset notification process may be decentralized, e.g., performed by a user device. Price data 2525 can include prices for one or more digital assets from one or more digital asset exchanges 2505. Price data 2525 can span any time period (e.g., the past 10 minutes, the past 24-hours, the past week, the past 3 months, all historical data, to name a few). Notification rules data 2530 may include user account data associated with notification settings, notification requests from users, generated notification rules, notifications, and notification history data, to name a few. Notification requests may comprise one or more notification instructions, and/or one or more digital asset notification parameters. Notification instructions may specify the frequency of notifications (e.g., real-time, once a day, once a week, to name a few), the notification alert types (e.g., SMS, email, mobile application push notifications, to name a few), and/or notification recipient information (e.g., email address, telephone number, mobile device ID, digital wallet ID, to name a few). Notification parameters may vary by notification type. For example, notification parameters may identify digital assets, digital asset exchanges, price thresholds (including price difference thresholds), time thresholds, rate thresholds (e.g., rate of increase, rate of decrease), exchange availability thresholds (e.g., whether a particular exchange is open for trading), to name a few, as required to set notifications as discussed herein.

FIG. 88B shows steps for providing digital asset notifications in accordance with exemplary embodiments of the present invention. In a step S2502, a notification system 2515 may receive from a user device 2510 notification instructions and one or more digital asset notification parameters. The received notification instructions and notification parameters may be stored by the notification system 2515. In embodiments, a user device 2510 may request notifications or otherwise activate or edit notifications by toggling notification settings through a software application (e.g., a mobile application or computer software) and/or through a website, to name a few. A user may also transmit a request for notifications, as through email, which request may indicate notification instructions and/or parameters or may trigger default or pre-programmed notification instructions and/or parameters.

In a step S2504, the notification system 2515 may generate one or more rules for automatic digital asset price notification based at least upon the one or more received parameters and the received notification instructions. For example, a notification rule may be a logical rule comprising a condition and an action. When the condition is satisfied, the action may be performed. Conditions may relate to the type of notification (e.g., price of a particular digital asset drops below a threshold, price exceeds a threshold, exchange is unavailable), and actions may relate to the type of notification (e.g., send an SMS to a particular mobile telephone number). The generated notification rules may be stored by the notification system 2515 and/or incorporated into price monitoring and comparison operations performed by a notification module 2520.

In a step S2506, the notification system 2515 may access, from one or more digital asset exchanges 2505, price data associated with one or more digital assets. A notification module 2520 may perform the step of accessing digital price data, e.g., by interfacing through one or more exchanges 2505 through one or more exchange APIs or by otherwise receiving or fetching the price data, as from a price feed. Price data may be normalized or otherwise formatted to be compatible with the notification system 2515.

In a step S2508, the notification system 2515 may evaluate the digital asset price data according to the notification rules. A notification module 2520 may perform step S2508. In embodiments, evaluation of digital asset price data may comprise comparing the price data to a price threshold to determine whether the threshold was reached and/or crossed.

In a step S2510, the notification system 2515 may generate one or more digital asset notifications. Notification generation may be performed by the notification module 2520. Digital asset notifications may be emails, SMS messages, push notifications, or other notifications, messages, or alerts, and they may indicate that notification criteria have been satisfied (e.g., price thresholds exceeded). Digital asset notifications may be price notifications, indicating the price of one or more digital assets.

In a step S2512, the notification system 2515 may transmit to one or more user devices 2510 the digital asset notification according to the notification instructions embodied in the notification rules. For example, notifications may be transmitted both to a cell phone, to an email account, and to a digital wallet client running on a computer. In embodiments, the user device 2510 that requests notifications (e.g., by setting notification settings) in a step S2502 may be a different user device from the user device that receives notifications in a step S2512. In embodiments, the users associated with the user devices that request notifications and receive notifications may be different users.

Figure 26A:
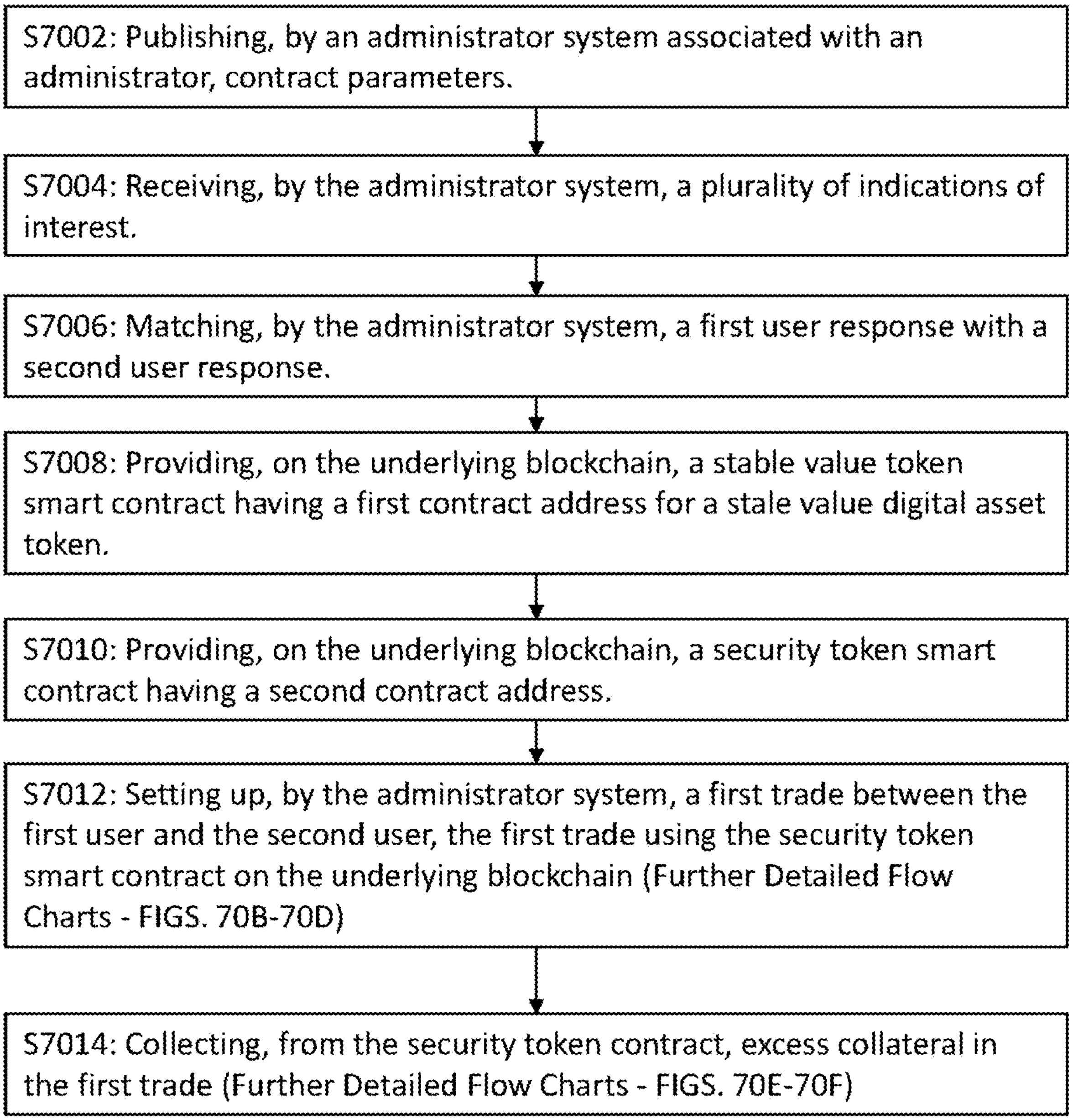
FIG. 26A is a flow chart of a processes for holding collateral for a security token in the form of a stable value token in a smart contract on an underlying blockchain in accordance with exemplary embodiments of the present invention.

FIGS. 89A-B are exemplary screen shots for setting digital asset notifications in exemplary embodiments of the present invention. FIG. 26A shows a digital asset price notification setup menu 2602. A user can select from various options related to a price threshold, including a rises above option 2604, a falls below option 2606, or an equals option 2608. A user can set a notification price 2610 and the corresponding denomination 2612, which comprise the price threshold. In embodiments, a user can set a notification price 2610 for a particular digital asset, but express the price in a different denomination (e.g., set a notification for when the price of one BITCOIN rises above 500 USD). A user may select one or more exchanges 2614 from which to monitor digital asset prices. A user may also select an alert type 2616, which can be used to set notification instructions. Alert types can include email, SMS, push notifications, to name a few.

FIG. 89B shows an exemplary interface for selecting a notification type 2622 in accordance with embodiments of the present invention. Notification types can indicate when a digital asset price rises above a threshold value, when a digital asset price drops below a threshold value, when a digital asset price equals a threshold value, when digital asset prices from two or more exchanges differ by a threshold amount (e.g., a percentage price difference), when a rate of digital asset price change meets or exceeds a threshold (e.g., the BITCOIN price in USD changes 5% in 2 minutes, the Litecoin price rises by 10 Litecoin in 1 hour, to name a few), when the price differential between two denominations meets or exceeds a threshold (e.g., the ratio of BITCOIN price to USD changes by 2%), when an exchange is unavailable (e.g., a particular exchange is not processing trades, an exchange from a list of exchanges to monitor is not available for trading, an exchange having an typical average daily volume exceeding some threshold is unavailable for trading), when volume of one or more exchanges satisfies (e.g., exceeds, reaches, or falls below) a threshold volume, when a difference in price between two exchanges satisfies a threshold (e.g., when prices from two predefined exchanges exceed a specified amount, or when the price differential of some threshold amount or percentage exists between any two of a plurality of exchanges being monitored), when a difference in transaction volume between two exchanges satisfies a threshold, and/or when an arbitrage opportunity exists (e.g., the conversion from USD to EUR to BITCOIN yields more BITCOIN than the conversion from USD to BITCOIN directly), to name a few. In embodiments, a notification type may comprise a digital wallet activity monitor, which may alert a user when any transactions or other activity is performed using a specified digital wallet. Such monitoring may entail monitoring a public ledger or transaction log, such as the BITCOIN blockchain. A user may input a wallet address or public key in order to request monitoring of the wallet. A user may input or select rules for wallet monitoring notifications, such as to receive notifications for any transactions involving the wallet, when assets are sent from the wallet, when assets exceeding a threshold amount are sent from the wallet, and/or when assets are sent to an address not on an approved list, to name a few. The notification system may generate and perform electronic monitoring instructions corresponding to the rules received from the user. A notification system may operate a digital asset network node in order to monitor an electronic transaction ledger. After a notification type 2622 is selected, a user may be required to input or otherwise set corresponding parameters, such as digital asset denominations to monitor, price thresholds, rates of price change, time periods for monitoring, and/or exchanges to monitor, to name a few.

FIGS. 90A-C are exemplary automated digital asset transactions in accordance with exemplary embodiments of the present invention. FIG. 90A illustrates an exemplary push notification, which may be received and/or displayed on a smart phone. The exemplary notification indicates that the price ratio of BITCOIN to Litecoin has dropped by 15%. FIG. 90B illustrates an exemplary SMS notification. It indicates that the price of BITCOIN is dropping at a rate of 22% per hour. FIG. 90C is an exemplary email notification. It indicates that there is a digital asset price difference across exchanges (e.g., Exchange X and Exchange Y) and shows an absolute value of the price difference (e.g., 2.4 BITCOIN) as well as a percentage difference (e.g., 6%). The email notification also provides a user with a link (e.g., a hyperlink to a website or to a software application) to access an exchange function of a digital wallet in order to perform one or more exchange transactions. Notifications can also include an option (e.g., a button, link, and/or other navigational tool or interface) to manage alerts, which can include setting notification types, alert types, and/or settings therefor. In other embodiments, alerts may be provided within applications, such as within a digital wallet client.

Digital Asset Automated Transaction System

FIGS. 91A-B are a schematic diagram and corresponding flow chart showing an exemplary system and an exemplary process for performing automated digital asset transactions. Automated transactions may be provided as a feature of a digital wallet application and/or as a stand-alone service. A stand-alone service may require a link to a digital wallet, bank account, credit card, and/or a deposit of funds with the stand-alone service.

FIG. 91A is a schematic diagram of an exemplary automatic digital asset transaction system and the entities involved in such a system. A user can arrange, from a user device 2810, for automated digital asset transactions. A user device 2810 can include a phone, smart phone, PDA, computer, and/or tablet computer, to name a few. A user may use a plurality of user devices 2810 in connection with the automatic digital asset transaction system of embodiments of the present invention.

An automatic digital asset transaction system 2815 can receive data, such as digital asset transaction data and/or digital asset price data, from one or more exchange 2805 (e.g., 2805-1, 2805-2, . . . , 2805-N), which may be digital asset exchanges. In embodiments, data may be received from one or more exchange agents.

Still referring to FIG. 91A, an automatic digital asset transaction system 2815 can comprise one or more computers or computer systems having at least one or more processors, computer-readable memory comprising one or more databases, one or more communications portals for communicating with one or more other computers or computer systems, and/or one or more input devices. An automatic digital asset transaction system 2815 can include a transaction module 2820, price data 2825, and/or transaction rules data 2830, to name a few. Price data 2585 can include prices for one or more digital assets from one or more digital asset exchanges 2805, which may also comprise exchange rate data. Price data 2825 can span any time period. In embodiments, one or more databases may store the data described herein. In embodiments, one or more software modules may perform the functions attributed herein to a transaction module 2820.

A transaction module 2820 may be software that can receive transaction instructions and transaction parameters, generate transaction rules, access data from one or more exchanges 2805, evaluate digital asset price data according to transaction rules, perform automated transactions (e.g., when pre-defined conditions are met), request authority (e.g., from a user) to proceed with an automatically generated transaction, and/or provide notifications of completed transactions, to name a few. In embodiments, one or more steps in a digital asset notification process may be decentralized, e.g., performed by a user device.

FIG. 91B shows steps for performing automated digital asset transactions in accordance with exemplary embodiments of the present invention. In a step S2802, an automatic transaction system 2815 may receive, from a user device 2810, transaction instructions and one or more transaction parameters. In embodiments, transaction parameters may include a digital asset strike price, e.g., to sell a specified amount of digital assets when the price equals, rises above, or falls below a predefined threshold, wherein the amount of digital assets to transact may be specified in a different denomination, such as USD. Transaction parameters thus may indicate digital asset denominations, digital asset amounts (expressed in any denomination, including fiat currency denominations), digital asset exchanges, time periods, rates of change, and/or absolute amounts of change, to name a few. Transaction instructions may indicate actions regarding digital assets, such as whether to buy, sell, hold, and/or convert to a different denomination of digital asset or fiat currency, to name a few.

In a step S2804, the automatic transaction system 2815 may generate one or more rules for automatic digital asset transactions based at least upon the one or more received transaction parameters and the received transaction instructions. The generated rules may be logical rules comprising one or more conditions and one or more actions to perform when the conditions are met or not met. Such logical rules may be implemented by computer code running on one or more computers associated with the automatic transaction system 2815. The generation of transaction rules may be performed by a transaction module 2820.

In a step S2806, the automatic transaction system 2815 may access, from one or more digital asset exchanges 2805, transaction data, which may include price data, associated with one or more digital assets. The automatic transaction system 2815 may store transaction data 2825 in one or more databases. The transaction data may be fetched or otherwise received, e.g., using APIs or data feeds from one or more exchanges 2805 or exchange agents. Transaction data may be normalized or otherwise formatted to be compatible with an automatic transaction system 2815, which formatting may be performed by a transaction module 2820.

In a step S2808, the automatic transaction system 2815 may evaluate the digital asset transaction data according to the generated transaction rules. In embodiments, evaluation of the digital asset transaction data may involve testing the transaction data against one or more logical conditions embodied in the transaction rules. For example, the transaction data may be evaluated to determine whether the digital asset price has reached or crossed a threshold value or whether a rate of change in the price has met or crossed a threshold value. A transaction module 2820 may perform the evaluation of the transaction data.

In a step S2810, the automatic transaction system 2815 may perform one or more digital asset transactions according to the transaction rules. Transactions may be performed, initiated, and/or verified by a transaction module 2820. The digital asset transactions may only be performed when one or more conditions are satisfied. In embodiments, an alert of a potential transaction and/or a request for authorization may be sent to a user before automatically performing a transaction. Receipt of a user's authorization by the automatic transaction system 2815 may be required before the system will perform a transaction. Authorization may be provided through telephone (e.g., dialing a number and entering certain digits), SMS (e.g., replying to a text message, sending a code, and/or sending another message authorizing a transaction), email (e.g., replying to an email and/or sending a certain message in the body and/or subject line), website (e.g., clicking an "Authorize" button), and/or within a software application, such as a digital wallet, to name a few. In embodiments, a request for authorization may be sent, and the transaction may be performed automatically if no response is received within a predetermined amount of time, settings for which may be set in advance by a user and/or set by default.

In a step S2812, the automatic transaction system 2815 may transmit one or more notifications of the performed transaction to one or more user devices 2810. Notifications may be generated by a transaction module 2820. In embodiments, notifications of incomplete, pending, and/or failed transactions may be transmitted. In embodiments, the automatic transaction system 2815 may provide a portal or other mechanism for a user to monitor and/or receive updates regarding transaction statuses. The automatic transaction system 2815 may provide a log of all transactions and/or automatic transactions performed by the system and/or by a user. In embodiments, the automatic transaction system 2815 may provide a log of all transaction opportunities, including declined transactions (e.g., not authorized by a user).

Digital Asset Automated Arbitrage System

FIGS. 92A-B are a schematic diagram and corresponding flow chart showing an exemplary system and an exemplary process for providing notifications of digital asset arbitrage opportunities. Arbitrage opportunities can arise due to exchange rate differences between different currency pairs. Embodiments of the present invention provide an automated system to map exchange rate transactions involving a plurality of exchanges and at least one digital asset and to compare the corresponding effective exchange rate to an exchange rate for a single currency pair. If the mapped plurality of exchange transactions has a different exchange rate from the rate for the single currency pair, an arbitrage notification system may provide notifications of the corresponding arbitrage opportunity. A transaction may be mapped from a digital asset to a fiat currency with any number of intermediate fiat currency and/or digital asset exchange transactions, from a flat currency to a digital asset with any number of intermediate fiat currency and/or digital asset exchange transactions, and/or from a fiat currency to a fiat currency with at least one intermediate digital asset exchange and any number of other intermediate exchanges. Accordingly, one or more foreign exchange transactions may be performed, as described herein.

FIG. 92A is a schematic diagram of an exemplary arbitrage notification system and the entities involved in such a system. A user can arrange, from a user device 2915, for arbitrage notifications. A user device 2915 can include a phone, smart phone, PDA, computer, and/or tablet computer, to name a few. A user may use a plurality of user devices 2915 in connection with the arbitrage notification system of embodiments of the present invention.

An arbitrage notification system 2920 can receive data, such as digital asset transaction data, from one or more digital asset exchange 2905 (e.g., 2905-1, 2905-2, . . . , 2905-N). In embodiments, data may be received from one or more digital asset exchange agents. An arbitrage notification system 2920 can also receive data, such as fiat currency price data, from one or more fiat currency exchanges 2910 (e.g., 2910-1, 2910-2, . . . 2910-*n*). In embodiments, fiat currency price data may be received from one or more fiat currency brokers 2940. In embodiments, receiving data may entail fetching data, such as by using an API to access data from one or more exchange.

Still referring to FIG. 92A, an arbitrage notification system 2920 can comprise one or more computers or computer systems having at least one or more processors, computer-readable memory comprising one or more databases, one or more communications portals for communicating with one or more other computers or computer systems, and/or one or more input devices. An arbitrage notification system 2920 can include an arbitrage module 2925, price data 2930, and/or arbitrage rules data 2935, to name a few. Transaction data 2930 can include prices for one or more digital assets, which may come from one or more digital asset exchanges 2905, as well as prices for one or more fiat currencies, which may come from one or more fiat currency exchanges 2910. Transaction data 2930 can also include volume transacted. Transaction data may comprise exchange rate data, such as currency pairs, which relate the exchange rate between two differently denominated currencies or assets. Transaction data 2930 can span any time period. In embodiments, one or more databases may store the data described herein. In embodiments, one or more software modules may perform the functions attributed herein to an arbitrage module 2925.

An arbitrage module 2925 may be software that receives and/or processes requests for arbitrage alerts, generates arbitrage notification rules, stores arbitrage notification rules, executes operations to access data from digital asset and fiat currency exchanges, maps exchange transactions, computes effective exchange rates for mapped transactions, evaluates effective exchange rates and direct exchange rates in accordance with arbitrage notification rules, and/or provides notifications of arbitrage opportunities, to name a few. In embodiments, one or more steps in an arbitrage notification process may be decentralized, e.g., performed by a user device.

FIG. 92B is a flow chart showing steps in an exemplary process for providing arbitrage alerts in exemplary embodiments of the present invention. In a step S2902, an arbitrage notification system 2920 may receive, from a user device 2915, one or more parameters comprising a request for arbitrage alerts, a starting denomination, and/or an ending denomination, where the starting and/or ending denomination is a digital asset denomination. In embodiments, both the starting and ending denominations may be fiat currency denominations. Parameters may identify digital assets, fiat currencies, threshold amounts (e.g., specifying notifications for arbitrage opportunities with 2% returns or higher), alert types, notification frequencies, and/or notification recipients, to name a few. The arbitrage notification system 2920 may generate and/or store arbitrage notification rules based upon the received parameters. Arbitrage notification rules may comprise notification criteria. Arbitrage notification rules may be logical rules comprising conditions (e.g., to test for the presence of arbitrage opportunities satisfying the received parameters) and/or corresponding notification actions. In embodiments of the present invention, arbitrage opportunities may relate to a futures market and/or futures prices including at least one digital asset.

In a step S2904, the arbitrage notification system 2920 may access, from one or more digital asset exchanges 2905, digital asset exchange rate data, which may comprise currency pairs relating prices for one or more digital assets to a plurality of other digital assets and/or fiat currencies. In embodiments, other digital asset data may be accessed. For example, a USD/BTC currency pair would provide a ratio of U.S. dollars to BITCOIN, which would comprise an exchange rate. Such a currency pair may be used to compute transactions from USD to BITCOIN and from BITCOIN to USD (using the reciprocal of the exchange rate). Accessing digital asset exchange rate data may entail using one or more APIs for one or more digital asset exchanges 2905 to fetch the price data and/or receiving a data stream of price data. In embodiments, digital asset exchange rate data may be obtained from one or more broker or exchange agent.

In a step S2906, the arbitrage notification system 2920 may access, from one or more fiat currency exchanges 2910, fiat currency exchange rate data, which may comprise one or more currency pairs relating prices for one or more fiat currencies to one or more other fiat currencies. An example of a fiat currency pair is EUR/USD, which relates Euros to U.S. dollars. Fiat currency exchange rate data may be accessed using one or more APIs for one or more fiat currency exchanges and/or by reading a data feed from one or more exchanges, to name a few. In embodiments, a fiat currency exchange 2910 may be an exchange in the foreign exchange market. In embodiments, exchange rate data may be obtained from one or more exchange agent or broker, such as a fiat currency broker 2940.

In a step S2908, the arbitrage notification system 2920 may map currency paths from a starting denomination to an ending denomination using at least two currency pairs or at least three denominations, since two currency pairs may share a common base. In embodiments, the arbitrage notification system 2920 may calculate arbitrage opportunities from the starting denomination to the ending denomination and/or from the ending denomination to the starting denomination. For the path from the starting to the ending denomination, the first currency pair in the currency path should include the starting denomination, while the last pair in the currency path should include the ending denomination. A currency path can include any number of intermediate currency pairs, which may or may not be cross currency pairs. For example, a currency path from USD to BTC may involve 1/(EUR/USD)*(EUR/JPY)*(JPY/BTC), where EUR/JPY is an intermediate cross currency pair. In embodiments, no starting or ending denominations may be received in a step S2902, and the arbitrage notification system 2920 may determine one or more currency paths relating a variety of denominations to detect the presence of any arbitrage opportunity among denominations supported by the arbitrage notification system 2920. In embodiments, only a starting or an ending denomination may be received, in which case the arbitrage notification system 2920 may determine a plurality of currency paths that start and/or end with the received denomination.

In a step S2910, the arbitrage notification system 2920 may compute effective exchange rates for the mapped currency paths. An effective exchange rate may relate the prices of two endpoints of a currency path. The effective exchange rate may be computed by multiplying the exchange rate for each currency pair in the currency path.

In a step S2912, the arbitrage notification system 2920 may evaluate (e.g., by processing on a computer system) arbitrage notification rules to determine the presence of an arbitrage opportunity meeting notification criteria and to determine actions to perform (e.g., notifications to transmit) based thereupon. In embodiments, evaluating arbitrage notification rules may entail, in part, comparing the computed effective exchange rates for one or more currency paths to a direct exchange rate associated with a currency pair relating the starting and ending denominations. Where the effective exchange rate differs from the direct exchange rate, as related by the direct starting/ending currency pair, an arbitrage opportunity may exist. An arbitrage opportunity can exist where the effective exchange rate is either greater than or less than the direct exchange rate.

The arbitrage notification system 2920 can formulate one or more transactions to take advantage of the arbitrage opportunity. The transactions required and the order in which they should be performed will depend, at least in part, on whether the effective exchange rate is greater than or less than the direct exchange rate. In embodiments, transactions may be structured to convert from one denomination to a different denomination. In other embodiments, circular transactions may be structured to perform a plurality of currency conversions and end with the original currency, ideally of a greater amount than transacted at the start (e.g., performing transactions according to a currency path from a starting to an ending denomination, followed by a direct transaction from the ending denomination to the starting denomination). Notifications may be provided to alert one or more users of the existence and/or details of such formulated transactions.

Accordingly, in a step S2914, the arbitrage notification system 2920 may provide to one or more user devices 2915 one or more notifications of one or more arbitrage opportunities. Notifications may indicate the existence of an arbitrage opportunity. Notifications may indicate a projected return on a series of transactions (e.g., 5% increase in BITCOIN holdings, 23 BTC increase, 800 USD increase, to name a few). Notifications may also indicate a currency path and/or a plurality of formulated transactions. Notifications can be provided to a plurality of devices associated with a user and via a plurality of media (e.g., SMS, email, automated telephone call, push notification, to name a few).

FIGS. 93A-B are a schematic diagram and corresponding flow chart showing an exemplary system and an exemplary process for performing digital foreign exchange systems opportunities in accordance with embodiments of the present invention. The exemplary system and processes described with respect to FIGS. 93A-B are similar to the exemplary arbitrage notification system discussed with respect to FIGS. 92A-B, with the added capability to execute formulated transactions to take advantage of determined arbitrage opportunities. Transactions may be performed to exchange digital assets to fiat currencies, digital assets to other digital assets, fiat currencies to digital assets, and/or fiat currencies to other fiat currencies involving intermediate digital asset exchange transactions. In embodiments, circular transactions may be performed to convert a starting digital asset to one or more intermediate denominations and then back to the starting digital asset. Circular transactions may also be performed to convert a starting fiat currency to one or more intermediate denominations involving at least one digital asset and then back to the starting fiat currency.

FIG. 93A is a schematic diagram of an exemplary arbitrage transaction system and the entities involved in such a system. A user can arrange, from a user device 3015, for automated arbitrage transactions. A user device 3015 can include a phone, smart phone, PDA, computer, and/or tablet computer, to name a few. A user may use a plurality of user devices 3015 in connection with the arbitrage transaction system of embodiments of the present invention (e.g., to set transaction settings, to confirm or authorize transactions, and/or to receive transaction status notifications).

An arbitrage transaction system 3020 can receive data, such as digital asset price data, from one or more digital asset exchange 3005 (e.g., 3005-1, 3005-2, . . . , 3005-N). In embodiments, data may be received from one or more digital asset exchange agents or brokers. An arbitrage transaction system 3020 can also receive data, such as fiat currency price data, from one or more fiat currency exchanges 3010 (e.g., 3010-1, 3010-2, . . . 3010-*n*). In embodiments, fiat currency price data may be received from one or more fiat currency brokers 3040. In embodiments, receiving data may entail fetching data, such as by using an API to access data from one or more exchange.

Still referring to FIG. 93A, an arbitrage transaction system 3020 can comprise one or more computers or computer systems having at least one or more processors, computer-readable memory comprising one or more databases, one or more communications portals for communicating with one or more other computers or computer systems, and/or one or more input devices. An arbitrage transaction system 3020 can include an arbitrage module 3025, price data 3030, and/or arbitrage rules data 3035, to name a few. Price data 3030 can include prices for one or more digital assets, which may come from one or more digital asset exchanges 3005, as well as prices for one or more flat currencies, which may come from one or more flat currency exchanges 3010. Price data 3030 may comprise exchange rate data, such as currency pairs, which relate the exchange rate between two differently denominated currencies or assets. Price data 3030 can span any time period. Price data 3030 may be converted into any form necessary for processing or normalizing against other price data (e.g., price data may be stored in 15-second increments). In embodiments, one or more databases may store the data described herein. In embodiments, one or more software modules may perform the functions attributed herein to an arbitrage module 3025.

An arbitrage module 3025 may be software that receives and/or processes requests for automated arbitrage transactions, generates arbitrage transaction rules, stores arbitrage transaction rules, executes operations to access data from digital asset and fiat currency exchanges, maps exchange transactions, computes effective exchange rates for mapped transactions, evaluates effective exchange rates and direct exchange rates according to arbitrage transaction rules, requests and/or processes transaction confirmation, performs transactions, and/or provides notifications of arbitrage transaction statuses, to name a few. In embodiments, one or more steps in an arbitrage notification process may be decentralized, e.g., performed by a user device.

FIG. 93B is a flow chart showing steps in an exemplary process for providing arbitrage alerts in exemplary embodiments of the present invention. In a step S3002, an arbitrage transaction system 3020 may receive, from a user device 3015, one or more parameters comprising a request for automated arbitrage transactions, a starting denomination, and an ending denomination. In embodiments, the starting denomination or the ending denomination may be a digital asset denomination, or the starting and ending denomination may be a fiat currency denomination and at least one intermediate digital transaction will be performed. In embodiments, the system may not receive a starting or an ending denomination or may not receive either. In such cases, the system may identify all possible transactions using whatever denomination is received or using any denominations supported by the arbitrage transaction system 3020. The parameters may be transaction criteria to determine when to perform transactions and/or parameters to govern how to perform transactions. Parameters may identify digital assets, fiat currencies, threshold amounts (e.g., specifying notifications for arbitrage opportunities with 2% returns or higher), amount of assets or currencies approved for automatic trading, transaction authorization settings, digital wallet information, transaction status alert types, notification frequencies, and/or notification recipients, to name a few.

In a step S3004, the arbitrage transaction system 3020 may generate one or more rules for automatic arbitrage transactions based at least in part on the received request for automatic arbitrage transactions and the starting and ending denominations, as may be determined by the system if not specified by a user.

In a step S3006, the arbitrage transaction system 3020 may store one or more rules for automatic arbitrage transactions. The rules may be stored in a database (e.g., for retrieval and use by arbitrage opportunity evaluation software or devices programmed to perform such operations) or integrated directly into a program for testing and evaluating exchange rate data, to name a few.

In a step S3008, the arbitrage transaction system 3020 may access, from one or more digital asset exchanges 3005, digital asset exchange rate data, which may comprise currency pairs relating prices for one or more digital assets to a plurality of other digital assets and/or fiat currencies. Accessing digital asset exchange rate data may entail using one or more APIs for one or more digital asset exchanges 3005 to fetch the price data and/or receiving a data stream of price data. In embodiments, digital asset exchange rate data may be obtained from one or more broker or exchange agent.

In a step S3010, the arbitrage transaction system 3020 may access, from one or more fiat currency exchanges 3010, fiat currency exchange rate data, which may comprise one or more currency pairs relating prices for one or more fiat currencies to one or more other fiat currencies. Fiat currency exchange rate data may be accessed using one or more APIs for one or more fiat currency exchanges and/or by reading a data feed from one or more exchanges, to name a few. In embodiments, a fiat currency exchange 3010 may be an exchange in the foreign exchange market. In embodiments, exchange rate data may be obtained from one or more exchange agent or broker, such as a fiat currency broker 3040.

In a step S3012, the arbitrage transaction system 3020 may map currency paths from a starting denomination to an ending denomination using at least two currency pairs or at least three denominations, since two currency pairs may share a common base. The mapping of currency paths is described herein with respect to step S2908.

In a step S3014, the arbitrage transaction system 3020 may compute effective exchange rates for the mapped currency paths. An effective exchange rate may relate the prices of two endpoints of a currency path. The effective exchange rate may be computed by multiplying the exchange rate for each currency pair in the currency path.

In a step S3016, the arbitrage transaction system 3020 may evaluate (e.g., by processing on a computer system) arbitrage transaction rules to determine the presence of an arbitrage opportunity meeting transaction criteria and to determine actions to perform (e.g., seeking authorization to perform a transaction and/or performing a transaction, to name a few) based thereupon. In embodiments, evaluating arbitrage transaction rules may entail, in part, comparing the computed effective exchange rates for one or more currency paths to a direct exchange rate associated with a currency pair relating the starting and ending denominations. Where the effective exchange rate differs from the direct exchange rate, as related by the direct starting/ending currency pair, an arbitrage opportunity may exist, and transactions may be formulated accordingly. Transactions may be structured to convert from one denomination to a different denomination (e.g., following one or more mapped currency paths). In other embodiments, circular transactions may be structured to perform a plurality of currency conversions and end with the original currency, ideally of a greater amount than transacted at the start (e.g., performing transactions according to a currency path from a starting to an ending denomination, followed by a direct transaction from the ending denomination to the starting denomination).

In embodiments, requests for authorization to proceed with a transaction may be sent to a user. In embodiments, if a response is not received from a user within a set period of time, the transaction may proceed.

In a step S3018, the arbitrage transaction system 3020 may perform one or more transactions according to the one or more rules for automatic arbitrage transactions. In embodiments, the performed transactions may follow the mapped currency paths.

In a step S3020, the arbitrage transaction system 3020 may provide one or more transaction status notifications. Transaction status notifications may indicate that one or more transactions were executed automatically, and/or the details of the transactions. Transaction status notifications may also indicate failed and/or pending transactions.

Digital Asset Foreign Exchange System

As previously described with respect to FIGS. 92A-B and 93A-B, foreign exchange transactions may be performed using one or more digital asset exchanges. In embodiments, a digital asset exchange may comprise a foreign exchange module configured to handle foreign exchange transactions. In embodiments, a separate foreign exchange system may interact with one or more digital asset exchanges to perform foreign exchange transactions.

FIGS. 94A-C are schematic diagrams of foreign exchange systems in accordance with exemplary embodiments of the present invention.

FIG. 94A shows exemplary participants in an embodiment of a digital asset-based foreign exchange system. A digital asset exchange computer system 77108 can include a foreign exchange module 77110, which may be stored in non-transitory computer-readable memory operatively connected to the computer system and which may be configured to run on one or more processors of the computer system. The foreign exchange module 77110 can process foreign exchange transactions. The digital asset exchange computer system 77108 can include a digital asset electronic ledger 77112, a first fiat currency electronic ledger 77114, and a second fiat currency electronic ledger 77116. In embodiments, the exchange computer system 777108 may be operatively connected to one or more banks 77118 comprising at least a first fiat currency bank account 77120, denominated in the first fiat currency, and a second fiat currency bank account 77122, denominated in the second fiat currency. In embodiments, account 77120 may be associated with a first bank, and account 77122 may be associated with a second bank. In embodiments, they may be associated with the same bank. In embodiments, the foreign exchange system may handle a plurality of fiat currencies. The system may be connected to a bank account for each fiat currency and may have a fiat currency ledger for each currency. In embodiments, the foreign exchange system may handle a plurality of digital asset types, and the system may have a respective digital asset ledger for each digital asset type.

FIG. 94B shows exemplary participants in another embodiment of a foreign exchange system. A foreign exchange system 77130 may be independent of one or more digital asset exchanges and/or fiat currency exchanges but may be operatively connected to them. For example, it may be operatively connected to a first digital asset exchange 77134 configured to exchange a first digital asset with a first fiat currency. The system may also be operatively connected to a second digital assert exchange 77140 configured to exchange the first digital asset with a second fiat currency. In embodiments, a single digital asset exchange may be configured to perform exchange transactions between a digital asset and multiple fiat currencies. Each digital asset exchange may be operatively connected to a bank with one or more bank accounts denominated in the respective fiat currency. In embodiments, the foreign exchange system 77130 may be affiliated with a particular digital asset exchange.

FIG. 94C shows another embodiment of a foreign exchange system. The system is similar to that described in FIG. 94B, but it includes a digital asset network ledger 77164. Exchange transactions at the one or more exchanges may be broadcast to a network ledger, such as the BITCOIN blockchain. The digital asset exchanges may transfer digital assets among each other using the network ledger 77164.

FIGS. 95A-B are flow charts of exemplary processes for performing foreign exchange transactions.

Referring to FIG. 95A, at a step S77202, a first digital asset exchange computer system may receive a foreign exchange transaction request. The request may comprise a transaction amount expressed in a starting currency, and a destination currency identifier, which may be a default currency identifier, such as EUR.

In a step S77204, the computer system may transfer or have transferred the transaction amount to a first exchange fiat account associated with the first user and denominated in the starting currency (e.g., draw from user's bank account linked to the exchange but unaffiliated with the exchange and deposit in the first exchange fiat account, which may be affiliated with the exchange). As an alternative, in a step S77206, the computer system may confirm that the transaction amount exists in the first exchange fiat account associated with the first user and denominated in the starting currency.

In a step S77208, the computer system may place a market buy order on a first order book denominated in the starting currency. The market buy order may be an order to buy a quantity of digital assets corresponding to the transaction amount at a current starting currency market price.

In a step S77210, the computer system may execute one or more transactions to fulfill the market buy order. In embodiments, the first digital asset exchange may execute these transactions, e.g., upon receiving a transaction request from the computer system.

In a step S77212, the computer system may debit (e.g., using a fiat currency electronic ledger) the first exchange fiat account by the transaction amount.

In a step S77214, the computer system may credit (e.g., using a digital asset electronic ledger) a digital asset account associated with the first user by the quantity of digital assets. Optionally, where the first exchange handles transactions in the starting currency and a second exchange handles transaction in the destination currency, in a step S77218, the computer system may transfer the quantity of digital assets to a second digital asset exchange denominated in the destination currency.

In a step S77216, the computer system may place a market sell order on a second order book denominated in the destination currency. The market sell order may be an order to sell the quantity of digital assets at a current destination currency market price.

In a step S77220, the computer system may execute one or more second transactions to fulfill the market sell order. In embodiments, the second digital asset exchange may execute these transactions, e.g., upon receiving a transaction request from the computer system.

In a step S77222, the computer system may debit the digital asset account by the quantity of digital assets.

In a step S77224, the computer system may credit a second exchange fiat account associated with the first user and denominated in the destination currency.

FIG. 95B shows another exemplary process for performing a foreign exchange transaction.

In a step S77232, a first digital asset exchange computer system may receive an electronic request from a user device associated with a first user for a limit order exchange transaction. The electronic request may comprise a transaction amount expressed in a starting currency, a digital asset purchase limit price, and a destination currency.

In a step S77234, the first digital asset exchange computer system may transfer the transaction amount to a first exchange fiat account associated with the first user and denominated in the starting currency. Alternatively, in a step S77236, the first digital asset exchange computer system may confirm that the transaction amount exists in a first exchange fiat account associated with the first user and denominated in the starting currency.

In a step S77238, the first digital asset exchange computer system may generate a machine-readable account hold instruction to hold the transaction amount in the first exchange fiat account.

In a step S77240, the first digital asset exchange computer system may generate a digital asset limit purchase order at the digital asset purchase limit price by determining a first transaction digital asset quantity corresponding to the transaction amount at the digital asset purchase limit price, wherein the first transaction digital asset quantity and the digital asset purchase limit price are digital asset purchase transaction parameters; and adding the digital asset purchase transaction parameters to a first digital asset order book denominated in the starting currency.

In a step S77242, the first digital asset exchange computer system may execute one or more transactions with one or more digital asset sellers to fulfill the digital asset limit purchase order.

In a step S77244, the first digital asset exchange computer system may generate a digital asset sell order comprising a sale of the purchased digital asset quantity for a second fiat currency.

In a step S77246, the first digital asset exchange computer system may execute the digital asset sell order.

In embodiments, a foreign exchange system may perform this process by interacting with one or more digital asset exchanges.

Examples of Financial Products Associated with a Digital Asset Exchange

In embodiments, insurance may be provided for digital assets, e.g., held by a digital asset exchange. Such insurance may be provided to individual users of digital assets (including vendors), groups of users, exchanges, exchange agents, trusts providing exchange traded products associated with digital assets, to name a few. Insurance may be provided for a digital asset wallet and/or the contents of a digital asset wallet (e.g., insurance for 100 BITCOIN stored in a digital wallet). Such insurance may involve secure storage of the private key to a wallet and/or the public key. In embodiments, the blended digital math-based asset price as discussed herein may be used as a benchmark for such insurance.

In embodiments, a digital asset kiosk, such as a digital math-based asset kiosk, may be used to perform one or more transactions associated with digital assets. The transactions may require an appropriate money transmit business in order to meet regulatory requirements. In embodiments, a person or entity must use a money transmit business registered in the person or entity's domicile.

In embodiments, a digital asset exchange may provide and/or support transactions (e.g., formation, buying, and/or selling) of derivate products. Such exchange traded derivatives can include options such as calls and/or puts. A digital asset exchange may also support digital asset lending, delayed settlements, derivative swaps, futures, and/or forwards, to name a few.

Lending of Digital Assets Using a Continuous Order Book

In embodiments, digital assets may be lent via a digital asset computer system using a continuous order book. FIGS. 109A-B shows an exemplary process for the loaning of digital assets by a digital computer system. In a step S6100, a digital asset computer system comprising one or more computers, the digital asset computer system being operatively connected to a decentralized digital asset network that uses a decentralized ledger in the form of a blockchain maintained by a plurality of physically remote computer systems to track at least one of asset ownership or transactions in a digital asset system, one or more exchange account databases stored on non-transitory computer-readable memory and comprising a plurality of exchange accounts, provides digital asset account information for a respective exchange account and user authentication data.

In a step S6101, the digital asset computer system receives, a deposit of digital assets to at least a first respective exchange account, from a first digital asset account, through use of a first digital asset account identifier associated with the first respective exchange account, where the deposit is recorded on the decentralized electronic ledger.

In a step S6102, the digital asset computer system provides a loan order database associated with a first digital asset and a first duration period, stored on the non-transitory computer-readable memory comprising at least a digital asset borrow order information comprising for each borrow order: borrow order identification information, borrow order digital asset quantities and corresponding borrow order interest rates and digital asset lend order information comprising for each lend order: lend order identification information, lend order digital asset quantities and corresponding lend order interest rates. In embodiments, the borrow order information and/or lend order information may include user identifications information, a time stamp, a credit score associated with the borrower or lender, margin information related to the borrower or lender and account balance information, to name a few.

In a step S6103, the digital asset computer system provides an electronic ledger comprising digital asset account balance data for each of the exchange accounts.

In a step S6104, the digital asset computer system receives, from a first user electronic device associated with a first user associated with a first exchange account, a first electronic digital asset borrow order comprising first borrow order information comprising a first borrow order digital asset quantity and a corresponding first borrow order interest rate.

As shown in FIG. 109B, in a step S6105, the digital asset computer system stores the first electronic digital asset borrow order information in the loan orders database.

In a step 6106, the digital asset computer system receives, from a second user electronic device associated with a second user associated with a second exchange account, a first electronic digital asset lend order comprising first lend order information comprising a lend order digital asset quantity from the deposit of digital assets and a corresponding lend order interest rate. In embodiments, step S6106 may occur either before or after step S6104. Thus, by way of example, in embodiments, a lend order may be received before a borrow order or a borrow order may be received before a lend order. Similarly, in embodiments, more than one lend order may be received before more than one borrow order, and vis-versa. Further, in embodiments, more than one lend order and/or more than one borrow order may be received in any order prior to matching in Step S6109, as discussed below. Thus, in embodiments, the digital asset system may store the first electronic asset lend order in the loan order database in step S6105.

In a step S6107, the digital asset computer system verifies that the first digital asset account balance data indicating a first digital asset account balance of a lender digital asset account associated with the second exchange account at least equals the lend order digital asset quantity.

In embodiments, the digital asset computer system may allow lenders to lend assets on margin. For example, the lender may be permitted to lend digital assets that are not already included in its account on the lender. In such case, the digital asset computer system may verify that the lender has sufficient assets to cover the value of the digital assets to be lent, wherein the assets may include fiat, digital assets or any other asset. In embodiments, the digital asset computer system, may verify the lender has sufficient credit, even without holding sufficient assets in the digital asset computer system, to go forward with the transaction.

In a step S6108, the digital asset computer system stores the first electronic digital asset lend order information in the loan orders database. In the case where the lend order is received before the borrow order, the first electronic digital asset borrow order may be stored in the loan order database at step S6108.

In embodiments, the digital asset computer system may receive a plurality of electronic digital asset lend orders and a plurality of electronic digital asset borrow orders. In embodiments the electronic digital asset lend order information and the electronic digital asset borrow order information from the plurality of borrow orders and lend orders is stored in the loan order database.

In a step S6109, the digital asset computer system matches the first electronic digital asset loan order with the first electronic digital asset lend order. In embodiments, where digital asset computer system may receive a plurality of electronic digital asset lend orders and a plurality of electronic digital asset borrow orders, a borrow order may be matched with one or more lend orders and/or a lend order may be matched with one or more borrow orders.

In a step S6110, the digital asset computer system generates first machine-readable transaction instructions for a first loan transaction having a first transaction digital asset quantity satisfying the first electronic digital asset borrow order and the first electronic digital asset lend order.

In a step S6111, the digital asset computer system executes the first machine-readable transaction instructions by updating the electronic ledger by decreasing, by the first transaction digital asset quantity, the first digital asset account balance data corresponding to the lender digital asset account and increasing, by the first transaction digital asset quantity, second digital asset account balance data corresponding to a first borrower digital asset account associated with the first exchange account.

In embodiments, the digital asset computer system may send electronic transfer confirmations to one or both of the first and second user electronic devices at the completion of the transaction. The digital asset computer system may also send electronic transaction confirmations to a computer system associated with an institution associated with the exchange institutional account.

In embodiments the interest rate or lending rate may be used as a benchmark for a financial instrument. In embodiments, the financial instrument may be an exchange traded product. In embodiments the digital asset may be a derivative product of a type selected from the group consisting of: an exchange traded derivative product, a fund, a company, an exchange traded fund, a note, an exchange traded note, a security, a debt instrument, a convertible security, an instrument comprising a basket of assets including one or more digital math-based assets and an over-the-counter product, to name a few.

In embodiments, the first digital asset may be a digital math-based asset. In embodiments the digital asset may be BITCOIN, Ether, Litecoin, BITCOIN Cash or Zcash, to name a few. In embodiments, the digital asset may be a token, such as a stable value token.

In embodiments, the user authentication data may comprise a username and password. The user authentication data may also comprise multi-factor authentication data.

Lending of Digital Assets Using an Auction

In embodiments, digital assets may be lent via a digital asset computer system using an auction. FIGS. 110A-C shows an exemplary process for the loaning of a first digital asset for a first duration by a digital computer system.

In a step S6200, a digital asset computer system generates a first electronic auction loan order book for the first digital asset for the first duration, on or after a first time associated with opening the electronic auction until a second time associated with closing the electronic auction. Part of this step includes a step S6201, of a digital asset computer system receiving a first plurality of auction loan orders associated with the first digital asset from a first plurality of user devices associated with a first plurality of users wherein each auction loan order may include characteristics representing the asset type of the first digital asset, the respective quantity of units of the first digital asset, a respective side of the transaction (borrow or lend), the duration of the loan and a respective interest rate on the loan. Another part of this step includes a step S6202, of a digital asset computer system verifying that each of the first plurality of auction loan orders is qualified based on the steps of the digital asset computer system verifying that the order characteristics of the respective loan order are valid auction order characteristics and, in the cases where the side of the transaction is lend, the digital asset computer system verifying that the respective user has sufficient amounts of the first digital asset to cover the first auction loan order if filled in full.

If step S6202 results in successful verification, the next step of step S6200 is step S6203, comprising a first step S6204 of the digital asset computer system updating each respective lender user account associated with each respective lender to set aside sufficient reserves in the first digital asset, sufficient to cover each respective auction loan order which has been successfully verified if filled in full and the step S6205, of the digital asset computer storing in the first electronic auction loan order book (on or more computer readable systems) each representative auction loan order which has been successfully verified.

In embodiments, in optional step S6206, the digital asset computer system may publish, at set time intervals starting with a third time and continuing until the second time, respective indicative results of the first auction loan order book if the auction were to close at the end of each respective time interval. The respective indicative results may comprise a respective indicative interest rate which is calculated by the digital asset computer system determining using the first auction loan order book, a respective indicative auction interest rate in terms of the first digital asset that will execute the greatest quantity of the first digital assets being transacted for the interest rate and in the case where more than one respective indicative auction interest rate is identified as having the same greatest quantity of the first digital assets being transacted, selecting as the respective indicative auction interest rate based on the midpoint of the two adjacent indicative auction interest rates identified for the fourth time. In embodiments, other tie breaking criteria may be used to select the indicative auction interest rate, exampled of which are discussed below. The respective indicative results also comprise a respective auction quantity, which is determined by the digital asset computer system, as the quantity of units of the first digital asset to be loaned at the respective indicative interest rate as of the fourth time.

In step S6207, the digital asset computer system closes the first auction loan order book, at the second time, and stops accepting new auction loan orders to be added to the first auction order book.

In step S6208, the digital asset computer system calculates final results of the first auction loan order book. The final results comprise a final auction price interest rate at the second time which is calculated by the digital asset computer system determining, using the first auction loan order book at the second time, a final auction interest rate in term of the first digital asset that will execute the greatest quantity of first digital assets being transacted and in the case where more than one respective final auction interest rate is identified as having the same greatest quantity of the first digital assets being transacted, selecting as the respective final auction interest rate based on the midpoint of the two adjacent indicative auction interest rates identified for the fourth time. In embodiments, when the more than one respective final auction interest rate is identified as having the same greatest quantity of the first digital assets being transacted, the final auction interest rate may be selected by some other tie breaking criteria, including lowest imbalance, the lower rate, the higher rate, the rate closest to the U.S. treasury rate for the same duration, the rate closest to a benchmark crypto asset rate at the same duration, the rate closer to LIBOR at the same duration, the rate closer to the continuous order book at the time of the auction, and the rate closer to a predetermined index rate at the time of the auction, to name a few. The final results also comprise a final auction quantity, which is determined by the digital asset computer system, as the quantity of units of the first digital asset which match the final auction interest rate as of the second time.

In embodiments, the order book data may be used to create a benchmark to be used in a financial product. In embodiments, the financial product may be, by way of illustration, an exchange traded product, a fund, an exchanged traded note, an exchange traded product, a call, a put, an option, an exchange traded derivative product, a fund, a company, an exchange traded fund, a note, an exchange traded note, a security, a debt instrument, a convertible security, an instrument comprising a basket of assets including one or more digital math-based assets and an over-the-counter product, an interest rate future, a future on swaps, an option on interest rate futures, an interest rate swap, a bond forward, a floating rate agreement (FRA), a structured, product such as a note bond or bill, a foreign exchange future, a foreign exchange forward, a foreign exchange listed option, a currency linked note and a currency swaption, to name a few.

In embodiments, the first digital asset may be a digital math-based asset. In embodiments the digital asset may be BITCOIN, Ether, Litecoin, BITCOIN Cash or Zcash. In embodiments, the digital asset may be a token, to name a few.

In embodiments, other forms of order books may be used to lend digital assets, such as block trade order books and limited order books, to name a few. In embodiments, requests for quotes (RFQs) or OTC voice transactions may be used to lend digital assets.

In embodiments, a method for lending digital assets by a digital asset computer system includes: (a) providing, by the digital asset computer system comprising one or more computers, the digital asset computer system being operatively connected to a decentralized digital asset network that uses a decentralized electronic ledger in the form of a blockchain maintained by a plurality of physically remote computer systems to track at least one of asset ownership or transactions in a digital asset system, one or more exchange account databases stored on non-transitory computer-readable memory and comprising for a plurality of exchange accounts the following information: (i) digital asset account information for a respective exchange account; (ii) user authentication data; (b) receiving, by the digital asset computer system, a deposit of digital assets to at least a first respective exchange account, from a first digital asset account, through use of a first digital asset account identifier associated with the first respective exchange account, where the deposit is recorded on the decentralized electronic ledger; (c) providing, by the digital asset computer system, a loan order database associated with a first digital asset and a first duration period, stored on the non-transitory computer-readable memory comprising at least the following information: (i) digital asset borrow order information comprising for each borrow order: borrow order identification information, borrow order digital asset quantities and corresponding borrow order interest rates; (ii) digital asset lend order information comprising for each lend order: lend order identification information, lend order digital asset quantities and corresponding lend order interest rates; (d) providing, by the digital asset computer system, an electronic ledger comprising, for each of the plurality of exchange accounts, digital asset account balance data; (e) receiving, by the digital asset computer system from a first user electronic device associated with a first user associated with a first exchange account, a first electronic digital asset borrow order comprising first borrow order information comprising a first borrow order digital asset quantity and a corresponding first borrow order interest rate; (f) storing, by the digital asset computer system in the loan orders database, the first electronic digital asset borrow order information; (g) receiving, by the digital asset computer system, from a second user electronic device associated with a second user associated with a second exchange account, a first electronic digital asset lend order comprising first lend order information comprising a lend order digital asset quantity from the deposit of digital assets and a corresponding lend order interest rate; (h) verifying, by the digital asset computer system, that first digital asset account balance data indicating a first digital asset account balance of a lender digital asset account associated with the second exchange account at least equals the lend order digital asset quantity; (i) storing, by the digital asset computer system in the loan orders database, the first electronic digital asset lend order information; (j) matching, by the digital asset computer system, the first electronic digital asset loan order with the first electronic digital asset lend order; (k) generating, by the digital asset computer system, first machine-readable transaction instructions for a first loan transaction having: (i) a first transaction digital asset quantity satisfying the first electronic digital asset borrow order and the first electronic digital asset lend order; and (l) executing, by the digital asset computer system, the first machine-readable transaction instructions by updating the electronic ledger according to the following steps: (i) decreasing, by the first transaction digital asset quantity, the first digital asset account balance data corresponding to the lender digital asset account; and (ii) increasing, by the first transaction digital asset quantity, second digital asset account balance data corresponding to a first borrower digital asset account associated with the first exchange account.

In embodiments, the first digital asset is a digital math-based asset.

In embodiments, the first digital asset may be one or more of BITCOIN, Ether, Litecoin, BITCOIN Cash, Zcash or a token.

In embodiments, a method for conducting an electronic auction to loan a first digital asset for a first duration, on a digital asset computer system, includes: (a) on or after a first time associated with opening the electronic auction until a second time associated with closing the electronic auction, generating, by the digital asset computer system, a first electronic auction loan order book for the first digital asset for the first duration, comprising: (i) receiving, by a digital asset computer system from a first plurality of user devices associated with a first plurality of users, a first plurality of auction loan orders associated with the first digital asset, wherein each auction loan order specifies order characteristics comprising: (1) the first digital asset as digital asset type; (2) a respective quantity of units of the first digital asset; (3) a respective side of the transaction, where the side is either borrow or lend; (4) the first duration as the duration for the loan; and (5) a respective interest rate on the loan; (ii) for each of the first plurality of auction loan orders, verifying, by the digital asset computer system, each respective first auction loan order is qualified, based on the steps of: (1) verifying, by the digital asset computer system, the order characteristics of the respective loan order are valid auction order characteristics; (2) in the case where the side of the transaction is lend, verifying, by the digital asset computer system, the respective user has sufficient amounts of the first digital asset to cover the first auction loan order if filled in full; (iii) upon successful verification of each respective auction loan order in step (a)(ii), the steps of: (1) updating, by the digital asset computer system, each respective lender user account associated with each respective lender to set aside sufficient reserves in the first digital asset, sufficient to cover each respective auction loan order which has been successfully verified if filled in full; and (2) storing in first electronic auction loan order book, by the digital asset computer system on one or more computer readable mediums, each respective auction loan order which has been successfully verified; (b) starting with a third time and continuing until the second time, electronically publishing, by the digital asset computer system, at set time intervals between the third time and the second time, respective indicative results of the first auction loan order book if the auction were to close at the end of each respective time interval, wherein the respective indicative results comprise: (i) a respective indicative interest rate, which is calculated, as of a respective fourth time, by: (1) determining, by the digital asset computer system, using the first auction loan order book, a respective indicative auction interest rate in terms of the first digital asset that will execute the greatest quantity of the first digital assets being transacted for the interest rate; and (2) in the case where more than one respective indicative auction interest rate is identified as having the same greatest quantity of the first digital assets being transacted, selecting as the respective indicative auction interest rate by applying the following order of priority: (A) the midpoint of the two adjacent indicative auction interest rates identified for the fourth time; and (ii) a respective auction quantity, which is determined by the digital asset computer system, as the quantity of units of the first digital asset to be loaned at the respective indicative price interest rate as of the fourth time; (c) at the second time, closing the first auction loan order book, by the digital asset computer system, and stop accepting new auction loan orders to be added to the first auction order book; (d) after step (c), calculating, by the digital asset computer system, final results of the first auction loan order book, wherein the final results comprise: (i) a final auction price interest rate at the second time, which is calculated by: (1) determining, by the digital asset computer system, using the first auction loan order book at the second time, a final auction interest rate in term of the first digital asset that will execute the greatest quantity of first digital assets being transacted; and (2) in the case where more than one respective final auction interest rate is identified as having the same greatest quantity of the first digital assets being transacted, selecting as the respective final auction price interest rate by applying the following order of priority: (A) the midpoint of the two adjacent indicative auction interest rates identified for the fourth time; and (ii) a final auction quantity, which is determined by the digital asset computer system, as the quantity of units of the first digital asset which match the final auction interest rate as of the second time, and (e) publishing, by the digital asset computer system, for the first auction loan order book, auction results comprising: the first digital asset, the first duration, the final auction interest rate and final auction quantity.

In embodiments, the first digital asset may be one or more of a digital math-based asset, BITCOIN, Ether, Litecoin, BITCOIN Cash, a token and Zcash.

In embodiments, the loan may be collateralized by a stable value digital asset (e.g., GEMINI DOLLAR, TRUEUSD, USD TETHER, PAXOS STANDARD, and/or BITCOIN Air, to name a few) a fiat backed digital asset (e.g., LIBRA), and/or a commodity-backed digital asset (e.g., DIGIX GOLD TOKENS).

In embodiments, the third time is 10 minutes prior to the second time.

In embodiments, the plurality of fourth times are one minute apart from each other.

Total Return Swap

In embodiments, digital assets held in, e.g., a custodial account may be used in a return swap. In a return swap, a return on a first asset may be swapped or exchanged for the return on a second asset for a period of time. Conventionally, the owner of an asset with a volatile return will swap or exchange this return for a less volatile return. FIG. 111A illustrates an exemplary embodiment of a method of performing a total return swap including digital assets.

In the context of digital assets, technological challenges are created due to the nature of the digital assets, being tied to a blockchain, and having high level of volatility.

In embodiments, in a step S66300, a digital asset computer system that includes one or more computer, provides an electronic ledger that includes user account information associated with each user of a plurality of users. The user account information includes at least user identification information and user collateral information indicating a value of collateral associated with each user of the plurality of users. In embodiments, the user collateral information may include a value of digital assets in accounts associated with the user, a quantity of digital assets in accounts associated with the user, a value of fiat in accounts associated with the user and/or a value of other assets in accounts associated with the user, to name a few. In embodiments, the user account information may also include obligation information associated with each user's payment obligations to others.

As step S66301, the digital asset computer system provides to a first user device associated with a first user and a second user device associated with a second user, swap transaction information that includes details regarding the swap. In embodiments, the swap transaction information includes swap information, a swap duration, at least one fixing date, and at least one benchmark rate. In embodiments, the swap information identifies the assets involved in the swap and preferably includes at least one digital asset and may include another digital asset, fiat, or any other asset, to name a few. In embodiments, the at least one fixing date is a date on which an agreed to interest rate, discussed below, is applied to determine the payment owed on both sides of the swap. In embodiments, there may be additional fixing dates which may apply to one or both sides of the swap. In embodiments, the swap information may also include a swap quantity which identifies the quantity of assets that are involved in the swap. In embodiments, each swap may include a quantity of one with users entering into multiple swaps if they wish to swap quantities of more than one.

In step 6302, the digital asset computer system receives from a first user device, associated with the first user of the plurality of users, swap bid information including first user side information and a first interest rate. In embodiments, the first user side information indicates whether the first user is buying protection or selling protection in the swap. Users who are buying protection are generally trading the return on a digital asset such as BITCOIN which is unknown, for example, for another predetermined return. In embodiments, a benchmark rate such as LIBOR may be used as a basis for the predetermined return. In embodiments, the predetermined return may be based on LIBOR plus some additional percentage. The two returns are swapped for the swap duration. In embodiments, the first interest rate is the first user's proposal for an interest rate and may be expressed in terms of a benchmark rate (LIBOR, for example) plus a predetermined percentage. This is the rate which the protection buyer would like to get. In embodiments, the first interest rate may be based on a notional value of the assets relative to each other. In embodiments, for example, where the swap is BITCOIN for U.S. dollars, the notional value of a BITCOIN in U.S. dollars is $10,000. The return rate may be set at a percentage that is based on the performance of BITCOIN. In this case, the owner of a BITCOIN may exchange the potential return on a BITCOIN for the swap duration for a set return rate, for example 10% of the notional value of the BITCOIN. In embodiments, as noted above, the interest rate may be set as a percentage of a benchmark rate or a benchmark rate plus a percentage. In such a case, the BITCOIN owner is referred to as a buyer of protection.

In step S66302*a*, the digital asset computer system receives, from the second user device, associated with the second user of the plurality of users a swap ask request including second user side information and a second interest rate. In embodiments, the second user side information indicates whether the second user is buying protection or selling protection. The second interest rate is the interest rate proposed by the second user for the swap. In embodiments, the second interest rate may be presented as a benchmark rate plus a predetermined percentage. In embodiments, the benchmark rate is one of the first benchmark rate and the second benchmark rate. Where the second user is a protection seller, the second interest rate is the rate which the second user is willing to pay in exchange for the potential return of the protection buyer's asset.

At step S66303, the digital asset computer system calculates margin requirements based on margin considerations. The margin requirements apply to both the first user and the second user (buyer and seller). In embodiments, an initial margin requirement is based on the margin considerations, including the swap pair information, continuous order book market data and/or one of more reference indexes. In embodiments, both the protection buyer and protection seller must provide sufficient collateral to cover at least a portion of the total value of the swap, which corresponds to the initial margin.

At step S66304, the digital asset computer system verifies that the value of collateral associated with each of the first user and the second user is equal to or greater than the initial margin requirement.

As shown in FIG. 111B, at step S66305, where the digital asset computer system verifies that the first user and the second user have sufficient collateral to meet the initial margin requirement, the digital asset computer stores the swap bid request and the swap ask request.

At step S66306, the digital asset computer system matches the first user side information with the second user side information where a match is achieved when the first user side information indicates a side opposite that of the second user side information.

At step S66306*a*, the digital asset computer system matches the first interest rate with the second interest rate where a match is achieved when the first interest rate is the same as the second interest. In embodiments, if there is no match, the digital asset computer system may continue to wait until there is a match, or at some point in time (as may be defined by the system) terminate the process.

At step S66307 the digital asset computer system generates transaction instructions in accordance with the swap transaction information, the first side user information, the second side user information and the matched first interest rate and second interest rate to transact the swap.

In step 6308, the digital asset computer system, updates the electronic ledger to change the account information of the first user and second user to reflect a decrease in the amount of collateral associated with the first user and second user in an amount equal to the initial margin. The digital asset computer system also updates the electronic ledger to change the obligation information of the first user and the second user in accordance with the swap transaction information and the matched first interest rate and second interest rate.

In step S66309, the digital asset computer system transmits a confirmation of the transaction to at least the first user device associated with the first user and the second user device associated with the second user.

In step 6309*a*, the digital asset computer system may publish the matched first interest rate and second interest rate.

As shown in FIG. 111C, in step S66310, the digital asset computer system may recalculate the margin to determine a variation margin. In embodiments, this recalculation step is performed periodically. In embodiments, the recalculation step may be based on the same considerations discussed above with respect to the initial margin.

At step 6311, the digital asset computer system may determine whether the recalculated margin exceeds the collateral of the first user or the second user. If so, in embodiments, the digital asset computer system may issue an alert to the first user or second user to increase their account balance to meet the recalculate margin. In embodiments, the first user and second user are provided a set period of time to increase their collateral prior to the computer asset computer system transferring collateral from the account of the first user or second user to the account of the other of the first user and the second user.

Swat Token

In embodiments, a Swap Token tied to an underlying blockchain, such as the ETHEREUM Blockchain may be provided.

By way of illustration and referring to the exemplary block diagram of FIG. 112B and the exemplary flow chart of FIG. 112A, a Swap Token may be implemented in accordance with the following steps. In this exemplary embodiment, the Swap Token may be used in conjunction with a stable value token (e.g., SVCoin), to set up a swap trade between User 1 (having a user address, User Address 1, associated with a private key User Private Key 1), and User 2 (having a user address, User Address 2, associated with a private key User Private Key 2). The user addresses, and associated private key, will typically be mathematically related to each other as used in PKI encryption. Each token may have one or more administrators associated with it, which have public addresses (e.g., admin1, admin2, etc.) and corresponding private keys (adminPriv1, adminPriv2, etc.).

In embodiments, the Swap Contract may include such terms as a duration.

In Step S6702, a Stable Value Token (such as SVCoin) is provided as discussed previously, with its own Contract Address, (e.g., svt), on an underlying Blockchain (e.g., the ETHEREUM Blockchain). In embodiments, the Stable Value Token will have its own smart contract (e.g., SV Coin Contract), using one or more contract addresses, consistent with embodiments otherwise described herein.

In Step S6704, a Swap Token is provided with its own Contract Address, (e.g., swapt) on the same underlying Blockchain. In embodiments, the Swap Token will have its own smart contract (e.g., Swap Contract), using one or more contract addresses, consistent with embodiments otherwise described herein. In embodiments, the Swap Contract may include instructions providing for:

Setting up trades (e.g., "setupTrade"), which will also assign a trade number (e.g., swapt. 101) to each trade when set up, as well as track parties to the trade (e.g., User Public Address 1 and User Public Address 2);

Checking balance of a particular address for the SVCoin Token (e.g., getbalanceof ([user address]));

Getting approval for a trade (e.g., svt.approve(swapt, 101)

Funding the trade (e.g., swapt.fundTrade(trade001))

Withdrawal funds (e.g., withdrawal(trade001, User Public Address 1)

In Step S6706, User 1 and User 2 agree to a trade, which the swap admin is aware of it. In embodiments, Step S6706 may be performed through an order book, such as a continuous order book or an auction order book, as discussed above.

In Step S6708, the swap admin calls a function on the smart contract 'swapt' to set up the trade (e.g., 'setupTrade' function). The setupTrade function may include as parameters, the parties to the trade (e.g., User 1 and User 2), the addresses of the participants in the trade (e.g., User Public Address 1 and User Public Address 2), the side of each party to the contract (e.g., buy or sell), as well as the other parameters, such as how much collateral is required, (e.g., 101), to name a few. The 'setupTrade' function returns some unique identifier (e.g., 'trade001'), to identify this particular trade and notifies User 1 and User 2 of the identifier 'trade001'. At the end of Step S6708, the trade is in an unfunded state.

In Step S6710, User 1 and User 2 will fund their collateral requirements for the trade (trade001) using the stable value token. In embodiments, this amount may be from a preexisting account (e.g., User Public Address 1 for User 1 and User Public Address 2 for User 2). In embodiments, each user's balance may be checked by using a function such as check balance function against the svt contract address (e.g., svt.balanceOf(User Public Address 1), and svt.balanceOf (User Public Address 2). In embodiments, one or more users may need to purchase new stable value tokens to fund the collateral requirement, in accordance with embodiments elsewhere discussed. Before the next step (Step S6710*a*), both users will have to have sufficient balances of stable value tokens in their respective public addresses to support the collateral requirements of the sap transaction.

In Step S6710*a*, User 1 will send to the svt contract address a message to fund the swapt contract address with the required collateral amount (e.g., 101 SVCoins). In embodiments, User 1 sends the transaction from User Public Address 1 to svt Contract Address with message instruction the transfer of the SVCoins from user's public address to the swap contract address (e.g., 'svt.approve(swapt, 101)'). This message would be signed by User 1, using User Private Key 1. Assuming User Public Address has a sufficient balance, and User Private Key 1 is authorized to sign for the transfer, the Stable Value Token Contract should approve and record the transfer.

In Step S6710*b*, User 1 makes a second transaction to fund the trade by, e.g., calling a fundTrade Function in the swap contract, including reference to the unique identifier of the trade (e.g., trade001). In this example, User 1 would send to the underlying blockchain, a transaction from User Public Address 1 to swapt Contract Address, with a message such as 'swapt.fundTrade(trade001)'. In response, the swap contract, executing the 'fundTrade' function, may internally call 'svt.transferFrom(User Public Address 1, swap, 101)' to transfer the previously approved tokens to itself (otherwise failing if User Public Address 1 did not approve the required tokens to fund the trade) and, if successful, marks trade001 in its datastore as being funded by User 1's side of the trade. At this point, trade001 has been half funded by User 1.

In Steps S6710*c* and S6710*d*, User 2 will need to carry out comparable steps as S6710*a* and S6710*b* for User 2's SVCoin tokens in User Public Address 2 and to support User 2's collateral obligations for its side of the trade (e.g., trade001).

In Step S6710*c*, User 2 will send to the svt contract address a message to fund the swapt contract address with the required collateral amount (e.g., 101 SVCoins). In embodiments, User 2 sends the transaction from User Public Address 2 to svt Contract Address with message instruction the transfer of the SVCoins from user's public address to the swap contract address (e.g., 'svt.approve(swapt, 101)'). This message would be signed by User 2, using User Private Key 2. Assuming User Public Address has a sufficient balance, and User Private Key 2 is authorized to sign for the transfer, the Stable Value Token Contract should approve and record the transfer.

In Step S6710*d*, User 2 makes an additional transaction to fund the trade by, e.g., calling a fundTrade Function in the swap contract, including reference to the unique identifier of the trade (e.g., trade001). In this example, User 2 would send to the underlying blockchain, a transaction from User Public Address 2 to swapt Contract Address, with a message such as 'swapt.fundTrade(trade001)'. In response, the swap contract, executing the 'fundTrade' function, may internally call 'svt.transferFrom(User Public Address 2, swap, 101)' to transfer the previously approved fiat currency to itself (otherwise failing if User Public Address 2 did not approve the required tokens to fund the trade) and, if successful, marks trade001 in its datastore as being funded by User 2's side of the trade.

At this point, trade001 has been fully funded by User 1 and User 2, and should be in a fully funded state. At a later point in time, in embodiments, either User 1 or User 2 may send a call request to the swapt contract address to collect from the posted collateral in trade001 if appropriate conditions have been met, using, e.g., a 'withdrawal' command.

In embodiments, a method for performing a return swap using a digital asset includes: (a) providing, by the digital asset computer system comprising one or more computers, an electronic ledger including user account information for a plurality of users, the user account information for each user of the plurality of users including: 1. user identification information; 2. collateral information; and 3. obligation information; (b) providing, from the digital asset computer system to a first user device associated with a first user and a second user device associated with a second user, swap transaction information including: 1. swap information; 2. a swap duration; 3. a t least one fixing date; and 4. at least one benchmark rate; (c) receiving, by the digital asset computer system from the first user device associated with the first user, a swap bid request, the swap bid request including: 1. first user side information; and 2. a first interest rate; (d) receiving, by the digital asset computer system from the second user device associated with the second user, a swap ask request, the swap ask request including: 1. second user side information; and 2. a second interest rate; (e) calculating, by the digital asset computer system, an initial margin amount based on margin consideration wherein the margin considerations include: 1. the swap information; 2. continuous order book market data; and 3. index information; (f) verifying, by the digital asset computer system, that an amount of collateral for the first user and for the second is greater than or equal to the sum of the initial margin; (g) where the digital asset computer system verifies that an amount of collateral for the first user and the second user is greater than or equal to the initial margin, storing the swap bid request and the swap ask request; (h) matching, by the digital asset computer system, the first user side swap information with the second user side swap information, where a match is achieved where the first user side information identifies a side opposite that identified by the second user side information; (i) matching, by the digital asset computer system, the first interest rate with the second interest rate, where a match is achieved where the first interest rate is the same as the second interest rate; (j) generating, by the digital asset computer system, transaction instructions in accordance with the swap transaction information, the first user side information, the second user side information and the matched first interest rate and second interest rate; (k) updating, by the digital asset computer system, the electronic ledger to: 1. change the account information of the first user and the second user to decrease the amount of collateral associated with the first user and second user in an amount equal to the initial margin, and 2. change the obligation information associated with the first use and second user to reflect their obligations including the swap transaction information and the matched first rate and second rate; (l) transmitting, by the digital asset computer system, a confirmation of the transaction to at least the first user device and the second user device; and (m) publishing, by the digital asset computer system, the matched first interest rate and second interest rate.

In embodiments, the method further includes the steps of: (n) recalculating, by the digital asset computer system, the margin; and (o) determining, by the digital asset computer system, whether the recalculated margin exceeds the collateral of the first user and the second user and issuing an alert to the first user and the second user to increase their collateral when the recalculated margin exceeds the collateral of the first user and the second user.

The present invention also relates to methods, systems and program products for depositing, holding and/or distributing collateral in the form of a stable value token for a security token, the tokens being on the same underlying blockchain.

FIGS. 48A-48D illustrate an embodiment of withdrawing/purchasing stable value digital asset tokens (i.e., Gemini Dollar tokens) in exchange for currency (e.g., an asset which may include fiat and/or cryptocurrency, fiat, digital asset, a basket of fiat and/or digital asset, and/or a combination thereof, to name a few). In embodiments, the asset-backed digital asset may be: a fiat-backed digital asset token (e.g., a Gemini Dollar), a stable value digital asset token, and/or LIBRA, to name a few. In embodiments, the fiat-backed digital asset may be backed by one or more amounts of one or more types of the following assets: one or more types of fiats (e.g., U.S. Dollars, Euro, Yen, British Pound, Swiss Franc, Canadian Dollar, Australian Dollar, New Zealand Dollar, Kuwaiti Dinar, Bahrain Dinar, Oman Rial, Jordan Dinar, Cayman Island Dollar, South African Rand, Mexican Pesos, Renminbi, to name a few); bank accounts in such fiat; one or more government securities denominated in such fiats (e.g., U.S. treasury certificates); municipal bonds or other government issued bonds, shares in exchange trade funds holding currencies or currency future contracts, one or more stocks; one or more bonds; one or more certificate of deposits ("CD"); to name a few. In embodiments, other forms of backed digital assets may also be used, where the assets may also include other digital assets, other physical assets (like real estate and/or inventors), securities, equities, bonds, commodities (e.g., gold, silver, diamonds, crops, oil, to name a few), or financial instruments (e.g., futures, puts, calls, credit default swaps, to name a few) one or more pieces of real estate; gold; diamonds; and/or a combination thereof, to name a few. In embodiments, the assets may be only one kind of asset (e.g., dollars held in a bank or government security or CD, to name a few) or a basket of assets (e.g., multiple fiats, e.g., dollars, euros, yen, to name a few). In embodiments, the value of the fiat-backed digital asset may fluctuate with the value of the assets backing the fiat-backed digital assets. The underlying value of the fiat-backed digital asset, in embodiments, may be updated in real-time, substantially real-time, periodically, and/or aperiodically, to name a few.

The process of withdrawing fiat-backed digital assets from a digital asset exchange may be similar to the process discussed above in connection with FIGS., 16A-16E, the description of which applying herein. The process of FIGS. 48A-48D may begin at step S4802. At step S4802, the digital asset exchange computer system authenticates an access request by a first user device (which may be similar to the process described in FIGS. 16B and 17B, the descriptions of which applying herein). The first user device, in embodiments, may be associated with a first user of the digital asset exchange computer system. In embodiments, the first user may be a user of the digital asset exchange associated with the digital asset exchange computer system. The digital asset exchange and digital asset exchange computer system may be operatively connected to each other via a network (e.g., Network 15).

In embodiments, first user device, as used herein, may, in embodiments, correspond to one or more suitable types of electronic devices including, but not limited to, desktop computers, mobile computers (e.g., laptops, ultrabooks), servers, mobile phones, portable computing devices, such as smart phones, tablets and phablets, televisions, set top boxes, smart televisions, personal display devices, personal digital assistants ("PDAs"), gaming consoles and/or devices, virtual reality devices, smart furniture, smart household devices (e.g., refrigerators, microwaves, etc.), smart vehicles (e.g., cars, trucks, motorcycles, etc.), smart transportation devices (e.g., boats, ships, trains, airplanes, etc.), and/or wearable devices (e.g., watches, pins/broaches, headphones, etc.), to name a few. In some embodiments, first user device 6104 may be relatively simple or basic in structure such that no, or a minimal number of, mechanical input option(s) (e.g., keyboard, mouse, track pad) or touch input(s) (e.g., touch screen, buttons) are included. For example, first user device 6104 may be able to receive and output audio, and may include power, processing capabilities, storage/memory capabilities, and communication capabilities. However, in other embodiments, first user device 6104 may include one or more components for receiving mechanical inputs or touch inputs, such as a touch screen and/or one or more buttons.

The first user device may, in embodiments, be a voice activated electronic device. A voice activated electronic device, as described herein, may correspond to any device capable of being activated in response to detection of a specific word (e.g., a word, a phoneme, a phrase or grouping of words, or any other type of sound, or any series of temporally related sounds). For example, a voice activated electronic device may be one or more of the following: Amazon Echo®; Amazon Echo Show®; Amazon Echo Dot®; Smart Television (e.g., Samsung® Smart TVs); Google Home®; Voice Controlled Thermostats (e.g., Nest®; Honeywell® Wi-Fi Smart Thermostat with Voice Control), smart vehicles, smart transportation devices, wearable devices (e.g., Fitbit®), and/or smart accessories, to name a few.

In embodiments, first user device may include one or more processor(s), memory, and a communication portal. One or more processor(s), may include any suitable processing circuitry capable of controlling operations and functionality of first user device, as well as facilitating communications between various components within first user device. In some embodiments, processor(s) may include a central processing unit ("CPU"), a graphic processing unit ("GPU"), one or more microprocessors, a digital signal processor, or any other type of processor, or any combination thereof. In some embodiments, the functionality of processor(s) 6104-A may be performed by one or more hardware logic components including, but not limited to, field-programmable gate arrays ("FPGA"), application specific integrated circuits ("ASICs"), application-specific standard products ("ASSPs"), system-on-chip systems ("SOCs"), and/or complex programmable logic devices ("CPLDs"). Furthermore, each of processor(s) 6104-A may include its own local memory, which may store program systems, program data, and/or one or more operating systems. However, processor(s) may run an operating system ("OS") for the first user device, and/or one or more firmware applications, media applications, and/or applications resident thereon. In some embodiments, processor(s) may run a local client script for reading and rendering content received from one or more websites. For example, processor may run a local JavaScript client for rendering HTML or XHTML content received from a particular URL accessed by the first user device.

In embodiments, as mentioned above, the first user device may also include memory. Memory may include one or more types of storage mediums such as any volatile or non-volatile memory, or any removable or non-removable memory implemented in any suitable manner to store data for the first user device. For example, information may be stored using computer-readable instructions, data structures, and/or program systems. Various types of storage/memory may include, but are not limited to, hard drives, solid state drives, flash memory, permanent memory (e.g., ROM), electronically erasable programmable read-only memory ("EEPROM"), CD ROM, digital versatile disk ("DVD") or other optical storage medium, magnetic cassettes, magnetic tape, magnetic disk storage or other magnetic storage devices, RAID storage systems, or any other storage type, or any combination thereof. Furthermore, memory 6104-B may be implemented as computer-readable storage media ("CRSM"), which may be any available physical media accessible by processor(s) to execute one or more instructions stored within memory. In some embodiments, one or more applications (e.g., mobile application software, gaming, music, video, calendars, lists, banking, social media etc.) may be run by processor(s) and may be stored in memory.

In embodiments, as mentioned above, the first user device may also include a communications portal. The communications portal may include any circuitry allowing or enabling one or more components of the first user device to communicate with one another, with the digital asset exchange computer system, and/or with one or more additional devices, servers, and/or systems. As an illustrative example, data retrieved from memory of the first user device may be transmitted via a network, to the digital asset exchange computer system using any number of communications protocols. For example, the network may be accessed using Transfer Control Protocol and Internet Protocol ("TCP/IP") (e.g., any of the protocols used in each of the TCP/IP layers), Hypertext Transfer Protocol ("HTTP"), WebRTC, SIP, and wireless application protocol ("WAP"), are some of the various types of protocols that may be used to facilitate communications between the first user device and the digital asset exchange computer system. In some embodiments, the first user device and the digital asset exchange computer system may communicate with one another via a web browser using HTTP. Various additional communication protocols may be used to facilitate communications between the first user device and/or the digital asset exchange computer system, include the following non-exhaustive list, Wi-Fi (e.g., 802.11 protocol), Bluetooth, radio frequency systems (e.g., 900 MHz, 1.4 GHz, and 5.6 GHz communication systems), cellular networks (e.g., GSM, AMPS, GPRS, CDMA, EV-DO, EDGE, 3GSM, DECT, IS 136/TDMA, iDen, LTE or any other suitable cellular network protocol), infrared, BitTorrent, FTP, RTP, RTSP, SSH, and/or VOIP.

The communications portal may use any communications protocol, such as any of the previously mentioned exemplary communications protocols. In some embodiments, the first user device may include one or more antennas to facilitate wireless communications with a network using various wireless technologies (e.g., Wi-Fi, Bluetooth, radiofrequency, etc.). In yet another embodiment, the first user device may include one or more universal serial bus ("USB") ports, one or more Ethernet or broadband ports, and/or any other type of hardwire access port so that the communications portal allows the first user device to communicate with one or more communications networks.

The digital asset exchange computer system and/or the digital asset exchange, in embodiments, may also each include one or more processor(s), network connection interface, and memory. The one or more processor of the digital asset exchange computer system and/or the digital asset exchange, as used herein, may be similar to the one or more processor(s) described above, the description of which applying herein. The network connection interface of the digital asset exchange computer system and/or the digital asset exchange may be similar to the communication portal described above, the description of which applying herein. Memory of the digital asset exchange computer system and/or the digital asset exchange may be similar to the memory described above, the description of which applying herein. In embodiments, the digital asset exchange computer system may be similar to exchange computer system 3230 described in connection with FIG. 5A and/or exchange computer system 3210, described in connection with FIG. 3, the descriptions of which applying herein.

Figure 48A:
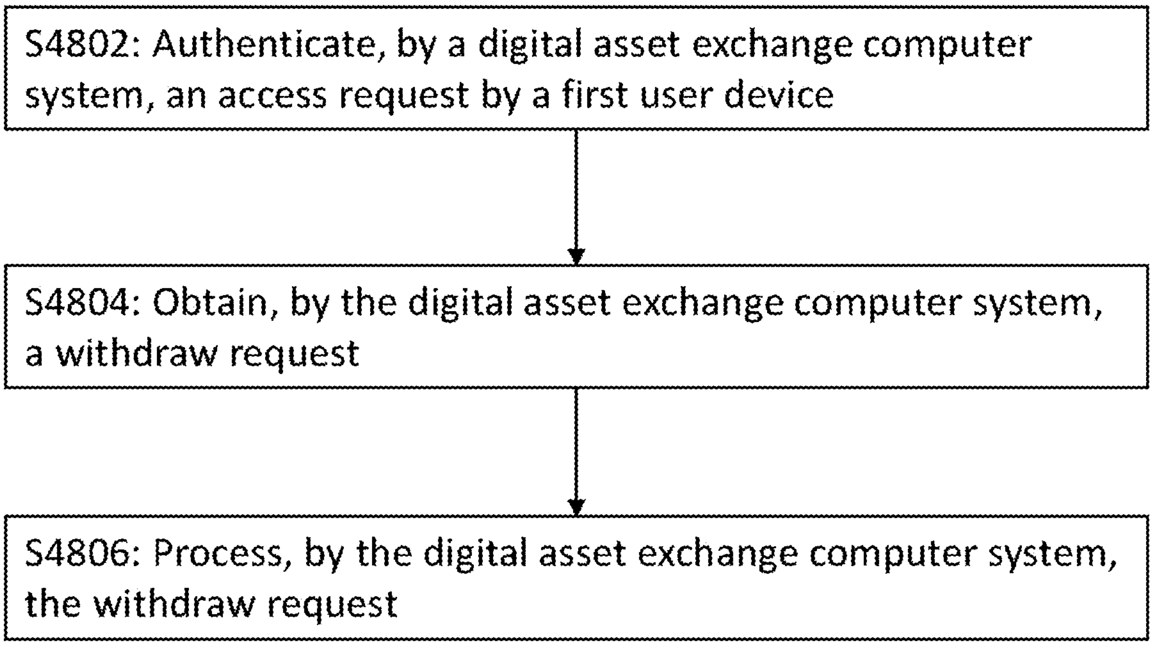
FIGS. 48A-48D are flow charts of a process for withdrawing fiat-backed digital asset on a digital asset security token in accordance with exemplary embodiments of the present invention.
Figure 48B:
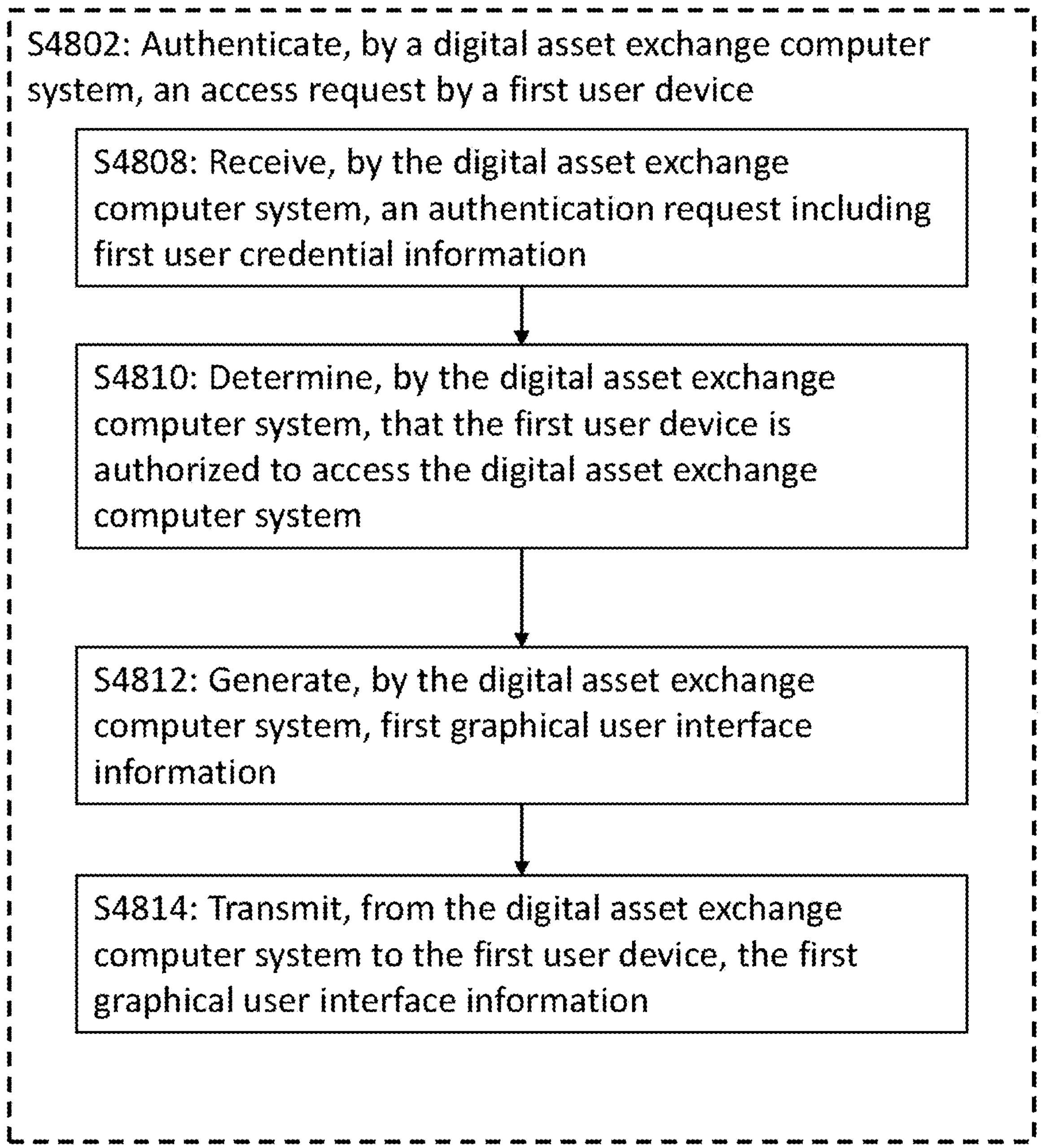

The process of authenticating an access request, in embodiments, may be performed via the steps illustrated in FIG. 48B. Referring to FIG. 48B, the process of authenticating an access request may begin at step S4808. In embodiments, at step S4808, the digital asset exchange computer system may receive an authentication request from a first user device. In embodiments, the authentication request may include first user credential information that is associated with the first user. First user credential information, in embodiments, may be a user name and corresponding password associated with the first user. For example, the first user device may try to log into the first user's respective account by entering its username and password. The username and password combination, continuing the example, may be sent by the first user device to the digital asset exchange computer system via a network. In embodiments, the first user credential information may further include one or more of the following: a name, email address, address, date of birth, and/or social security number, to name a few.

In embodiments, the first user credential information may be similar to the authentication data 5112 described in connection with FIG. 5A, the description of which applying herein. In embodiments, the authentication request may be made from the first user device via a secure channel, such as an encrypted communication. For example, the authentication request may be encrypted using an asymmetric key, such as a PKI key, or using a symmetric key, such as used in TLS, to name a few. The authentication request, in embodiments, may be encrypted by the sender (e.g., the first user device) and/or the recipient (e.g., the digital asset exchange computer system), to name a few.

The process of authenticating an access request may continue with step S4810. At step S4810, the digital asset exchange computer system determines that the first user device is authorized to access the digital asset exchange computer system. In embodiments, the digital asset exchange computer system may authorize the first user device based on the first user credentials. For example, the digital asset exchange computer system may obtain verified first user credentials (e.g., credentials associated with the first user that are already verified) by accessing (via e.g., authenticator module 5124) one or more user identification data bases (e.g., user identification data 5110, user authentication data 5112) that store the verified first user credentials. Once obtained, the verified first user credentials may be compared to the received first user credentials by the digital asset exchange computer system. If the received first user credentials do not match the verified first user credentials, the digital asset exchange computer system may determine that the first user is not authorized to access the digital asset exchange computer system. If the received first user credentials are not authorized the process of FIGS. 48A-48D may stop here and/or, in embodiments, the digital asset exchange computer system may generate and send a notification to the first user device, indicating the failed log in attempt. In embodiments, a notification may be sent to a second user device associated with the first user, the notification indicating a failed log in attempt. In embodiments, such a notification may be made via a secure channel, such as an encrypted communication. For example, the notification may be encrypted using an asymmetric key, such as a PKI key, or using a symmetric key, such as used in TLS, to name a few. The notification, in embodiments, may be encrypted by the sender (e.g., the digital asset exchange computer system) and/or the recipient (e.g., the first user device), to name a few.

In embodiments, the digital asset exchange computer system may further verify the first user credentials. The digital asset exchange computer system may determine whether the first user is a registered user of the digital asset exchange associated with the digital asset exchange computer system. The verification process may be similar, with verified registered user credentials being compared to the first user credentials. In embodiments, the first user may be authorized to access the digital asset exchange computer system, but not a registered user. In embodiments, the digital asset exchange may be a government regulated authority.

The process of authenticating an access request, in embodiments, may continue with step S4812. In embodiments, at step S4812 the digital asset exchange computer system may generate first graphical user interface information. In embodiments, the first graphical user interface information may be for displaying a graphical user interface on the first user device. For example, the first graphical user interface information may include first machine-readable instructions representing one or more of the following: (1) a home page of a website or mobile application associated with the digital asset exchange computer system; and/or (2) a log-in success message and/or home page, to name a few.

The process of authenticating an access request may continue with step S4814. At step S4814, the digital asset exchange computer system may transmit the first graphical user interface information to the first user device via a network. In embodiments, upon receipt of the first graphical user interface information, the first user device displays the graphical user interface associated with the graphical user interface information on a display of the first user device. For example, the digital asset exchange computer system may send the first machine-readable instructions to the first user device, and, upon receiving the first machine-readable instructions, the first user device executes the first machine-readable instructions which may cause the first GUI to be displayed on a display screen of the first user device. In embodiments, such a transmission may be made via a secure channel, such as an encrypted communication. For example, the first graphical user interface information (and/or the first machine-readable instructions) may be encrypted using an asymmetric key, such as a PKI key, or using a symmetric key, such as used in TLS, to name a few. The first graphical user interface information (and/or first machine-readable instructions), in embodiments, may be encrypted by the sender (e.g., the digital asset exchange computer system) and/or the recipient (e.g., the first user device), to name a few.

Referring back to FIG. 48A, the process of withdrawing fiat-backed digital assets (and/or asset-backed digital assets and/or stable value digital assets) from a digital asset exchange may, in embodiments, continue with step S4804. At step S4804, the digital asset exchange computer system may obtain a withdraw (e.g., redemption) request. In embodiments, the digital asset exchange computer system may obtain the withdraw request by receiving a withdraw request from the first user device via a network. In embodiments, the withdraw request may be made via a secure channel, such as an encrypted communication. For example, the withdraw request may be encrypted using an asymmetric key, such as a PKI key, or using a symmetric key, such as used in TLS, to name a few. The withdraw request, in embodiments, may be encrypted by the sender (e.g., the first user device) and/or the recipient (e.g., the digital asset exchange computer system), to name a few.

Figure 48C:
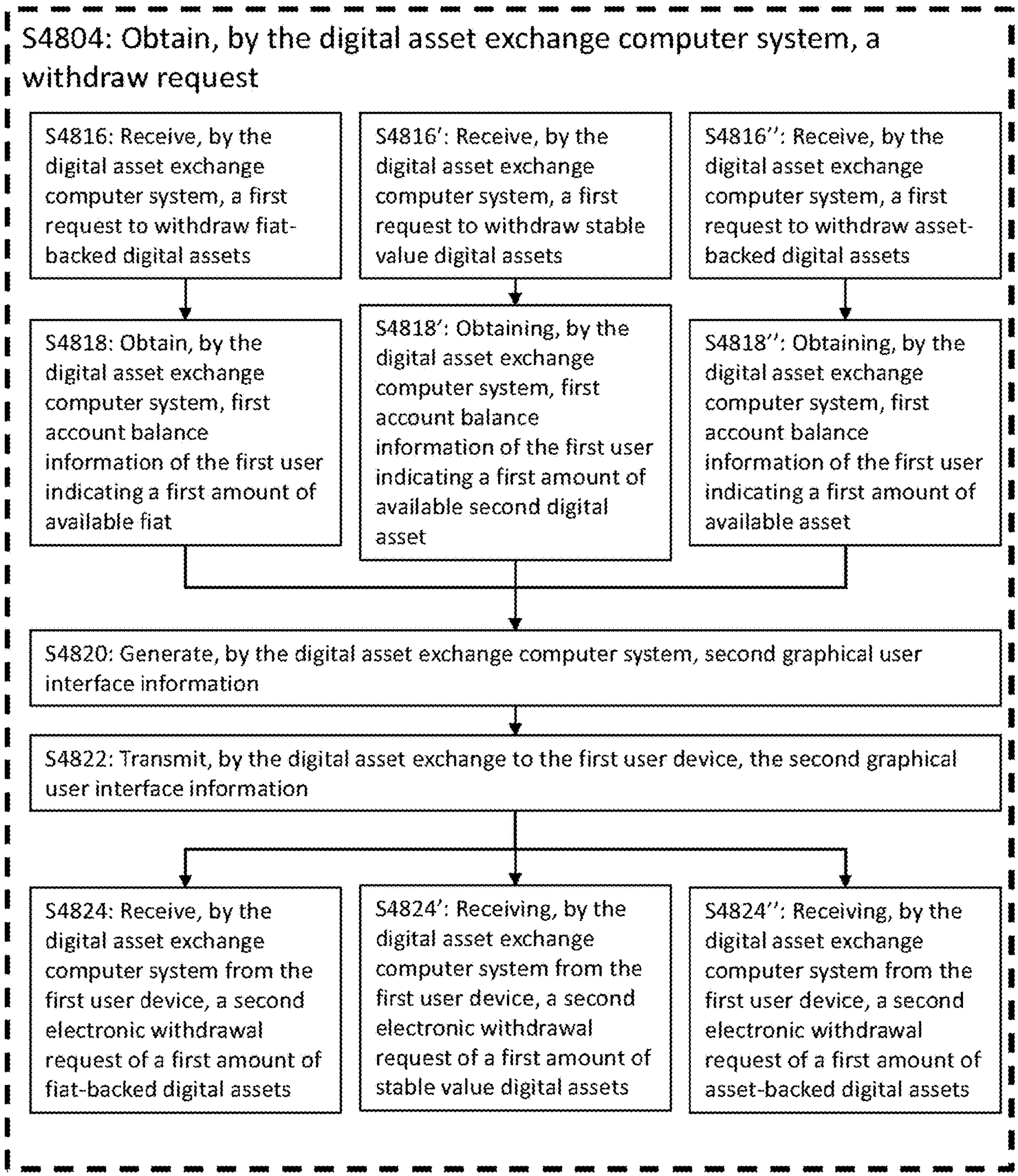

The process of obtaining a withdraw request may be performed via the steps illustrated in FIG. 48C. Referring to FIG. 48C, in embodiments, the process of obtaining a withdraw request may begin at step S4816. At step S4816, the digital asset exchange computer system may receive a first request to withdraw fiat-backed digital assets from the first user device.

In embodiments, the fiat-backed digital asset may be tied to a distributed transaction ledger which may be maintained on a peer-to-peer network that includes a plurality of geographically distributed computer systems. In embodiments, the distributed transaction ledger may be public, private, semi-private, and/or semi-public, to name a few. For example, the distributed transaction ledger may be published publicly available to anyone who wants to see it. As another example, the distributed transaction ledger may not be published and, to be able to access the distributed transaction ledger, a user may send a query the peer-to-peer network.

The peer-to-peer network, in embodiments, may be: the ETHEREUM Network, the LIBRA Network, the NEO Network, the BITCOIN network, and/or the STELLAR Network, to name a few. The peer-to-peer network, in embodiments, may be based on a mathematical protocol for proof of work. The peer-to-peer network, in embodiments, may be based on a mathematical protocol for proof of stake. The peer-to-peer network, in embodiments, may be based on a cryptographic mathematical protocol. In embodiments, the peer-to-peer network may be based on a mathematical protocol that is open sourced. In embodiments, the digital asset security token database, in embodiments, may be stored on computer readable media associated with a digital asset security token issuer system (e.g., memory of the digital asset security token issuer system). In embodiments, the digital asset security token database may be maintained and stored on the plurality of geographically distributed computer systems in the peer-to-peer network.

In embodiments, the distributed transaction ledger may include a fiat-backed digital asset database. In embodiments, the fiat-backed digital asset data base may be maintained on a sidechain. A sidechain, in embodiments, may refer to a portion of the distributed transaction ledger. For example, an administrator, user, and/or trusted entity may maintain a portion of the distributed transaction ledger and/or an electronic copy of a portion of the distributed transaction ledger. In embodiments, a portion of the distributed transaction ledger, in the context of a Merkel Tree, may refer to one or more "leafs" of the Merkel Tree, one or more statuses of the Merkel Tree, and/or a complete Merkel Tree with one or more past transactions being "pruned." In the context of a blockchain, the portion of the distributed transaction ledger may be one or more blocks of the blockchain. The information on the sidechain may be updated periodically or aperiodically. For example, the information on the sidechain may be updated, published, and stored on the peer-to-peer network at predetermined times (e.g., twice a day, once a day, once a week, once a month, and/or once a quarter, to name a few). As another example, the information on the sidechain may be updated, published, and stored on the peer-to-peer network after the execution of a transaction and/or the execution of a batch of transactions. As yet another example, the information on the sidechain may be updated, published, and stored on the peer-to-peer network after the commitment of a transaction and/or the commitment of a batch of transactions. A transaction, for example, may be committed by a consensus of trusted entities of the peer-to-peer network.

In embodiments, the peer-to-peer network may utilize one or more protocols and/or programs for security purposes. For example, the peer-to-peer network may utilize a byzantine fault tolerance protocol as a consensus mechanism. As another example, the peer-to-peer network may utilize a whitelist for the execution of a transaction and/or the transfer of funds. As yet another example, the peer-to-peer network may also utilize one or more of the following: encryption, point-to-point encryption, two-factor authentication, and/or tokenization, to name a few.

As described above, the withdrawal request may, in embodiments, be a request to withdraw a digital asset in exchange for currency. The digital asset, in embodiments and as described above, may be an asset-backed digital asset (which may include a fiat-backed digital asset and/or a digital asset backed digital asset), a stable value digital asset (which may include a fiat-backed digital asset and/or a digital asset backed digital asset), and/or a fiat-backed digital asset, to name a few. For example, the process for obtaining a request to withdraw a first amount of asset-backed digital assets may begin with step S4816". At step S4816", in embodiments, the digital asset exchange computer system may receive a first request to withdraw asset-backed digital assets. The request, in embodiments, may be received from the first user device. In embodiments, the withdraw request may be made via a secure channel, such as an encrypted communication. For example, the withdraw request may be encrypted using an asymmetric key, such as a PKI key, or using a symmetric key, such as used in TLS, to name a few. The withdraw request, in embodiments, may be encrypted by the sender (e.g., the first user device) and/or the recipient (e.g., the digital asset exchange computer system), to name a few.

As another example, the process for obtaining a request to withdraw a first amount of stable value digital assets may begin with step S4816'. At step S4816', in embodiments, the digital asset exchange computer system may receive a first request to withdraw stable value digital assets. The first request, in embodiments, may be received from the first user device. In embodiments, the withdraw request may be made via a secure channel, such as an encrypted communication. For example, the withdraw request may be encrypted using an asymmetric key, such as a PKI key, or using a symmetric key, such as used in TLS, to name a few. The withdraw request, in embodiments, may be encrypted by the sender (e.g., the first user device) and/or the recipient (e.g., the digital asset exchange computer system), to name a few.

The process for obtaining a withdrawal request may continue with step S4818. At step S4818, in embodiments, in response to receiving the first request to withdraw fiat-backed digital assets, the digital asset computer system may obtain first account balance information of the first user. The first account balance may, in embodiments, indicate a first amount of available fiat. The first amount of available fiat may be fiat owned by the first user that is located in an account associated with the first user and the digital asset exchange computer system. In embodiments, the first amount of available fiat may be owned by the first user and in the custody of the digital asset exchange computer system and/or the digital asset exchange. In embodiments, the first account balance information may be stored on a fiat ledger associated with the digital asset exchange computer system (e.g., fiat account balance data 5118-1, electronic ledger data 5116-1, fiat account module 5134-1). Obtaining an account balance may be similar to the descriptions of obtaining an account balance described throughout, the description of which applying herein.

As described above and continuing the processes, the withdrawal request may be a request to withdraw a digital asset in exchange for an asset-backed digital asset. The process for obtaining a withdraw request for an amount of asset-backed digital asset may continue with step S4818". At step S4818", in embodiments, the digital asset exchange computer system may obtain first account balance information of the first user indicating a first amount of available asset. The first account balance may, in embodiments, indicate a first amount of available asset. The first amount of available asset may be asset(s) owned by the first user held in an account associated with the first user and the digital asset exchange computer system (and/or held in the custody of the digital asset exchange computer system on behalf of the first user). In embodiments, the first amount of available asset may be owned by the first user and in the custody of the digital asset exchange computer system and/or the digital asset exchange. In embodiments, the first account balance information may be stored on an asset ledger associated with the digital asset exchange computer system (e.g., electronic ledger data 5116). Obtaining an account balance may be similar to the descriptions of obtaining an account balance described throughout this application, the descriptions of which applying herein.

As described above and continuing the processes, the withdrawal request may be a request to withdraw a digital asset in exchange for a stable value digital asset. The process for obtaining a withdraw request for an amount of stable value digital asset (e.g., backed by a second digital asset and/or a basket of digital assets—the asset(s) being maintained on the same blockchain or different blockchain than the stable value digital asset) may continue with step S4818'. At step S4818', in embodiments, the digital asset exchange computer system may obtain first account balance information of the first user indicating a first amount of available second digital asset. The first account balance may, in embodiments, indicate a first amount of available second digital asset. The first amount of available second digital asset may be second digital asset owned by the first user held in an account associated with the first user and the digital asset exchange computer system (and/or held in the custody of the digital asset exchange computer system on behalf of the first user). In embodiments, the first amount of available second digital asset may be owned by the first user and in the custody of the digital asset exchange computer system and/or the digital asset exchange. In embodiments, the first account balance information may be stored on an asset ledger associated with the digital asset exchange computer system (e.g., electronic ledger data 5116). Obtaining an account balance may be similar to the descriptions of obtaining an account balance described throughout this application, the descriptions of which applying herein.

The process for obtaining a withdrawal request (e.g., a withdrawal request for fiat-backed digital assets, asset-backed digital assets, and/or stable value digital assets) may continue with step S4820. At step S4820, in embodiments, the digital asset exchange computer system may generate second graphical user interface information. In embodiments, the second graphical user interface information may be for displaying a graphical user interface on the first user device. For example, the second graphical user interface information may include second machine-readable instructions representing one or more of the following: (1) a display that includes the first account balance information; (2) a display that includes user identification information; and/or (3) a display that includes the first user's past transactions (all of the past transactions and/or a portion of the past transactions), to name a few. In embodiments, such a transmission may be made via a secure channel, such as an encrypted communication. For example, the second graphical user interface information (and/or the second machine-readable instructions) may be encrypted using an asymmetric key, such as a PKI key, or using a symmetric key, such as used in TLS, to name a few. The second graphical user interface information (and/or second machine-readable instructions), in embodiments, may be encrypted by the sender (e.g., the digital asset exchange computer system) and/or the recipient (e.g., the first user device), to name a few.

The process of obtaining a withdrawal request may continue with step S4822. At step S4822, the digital asset exchange computer system may transmit the second graphical user interface information to the first user device via a network. In embodiments, upon receipt of the second graphical user interface information, the first user device displays the graphical user interface associated with the graphical user interface information on a display of the first user device. For example, the digital asset exchange computer system may send the second machine-readable instructions to the first user device, and, upon receiving the second machine-readable instructions, the first user device executes the second machine-readable instructions which may cause the second GUI to be displayed on a display screen of the first user device.

The process for obtaining a withdrawal request may continue with step S4824. At step S4824, in embodiments, the digital asset exchange computer system may receive a second electronic withdrawal request of a first amount of fiat-backed digital assets. The second electronic withdrawal request may include one or more of the following: an amount of fiat-backed digital assets to withdraw (e.g., the first amount of fiat-backed digital assets); a designated public address on the disturbed transaction ledger of which the withdrawal of fiat-backed digital assets is directed towards; and/or a timestamp, to name a few. The timestamp, in embodiments, may be one or more timestamps indicating one or more of the following: the time and/or date at which the second withdrawal request was sent, the time and/or date at which the second withdrawal request was received, and/or the time and/or date the first user wishes to withdraw the first amount of fiat-backed digital assets, to name a few. In embodiments, the second withdraw request may be digitally signed by a private key associated with the first user. The private key associated with the first user may, in embodiments, have a corresponding public key. The public key and private key, in embodiments, may be mathematically related. The public key may be associated with one or more private keys. The one or more private keys may be mathematically related to one another. In embodiments, the public key associated with the first user may be used to generate a first user public address associated with the first user. The first user public address, in embodiments, may be generated by applying a hash algorithm to the public key associated with the first user. The result of the application of the hash algorithm may, in embodiments, be the first user public address. In embodiments, the second withdrawal request may be made via a secure channel, such as an encrypted communication. For example, the second withdrawal request may be encrypted using an asymmetric key, such as a PKI key, or using a symmetric key, such as used in TLS, to name a few. The second withdrawal request, in embodiments, may be encrypted by the sender (e.g., the first user device) and/or the recipient (e.g., the digital asset exchange computer system), to name a few.

In embodiments, the designated public address may be associated with a public key which may have been used to generate the designated public address. For example, the digital asset address associated with the designated public address may be generated by applying a hash algorithm to the public key associated with the user associated with the designated public address. The result of the application of the hash on the public key may be the designated public address.

In embodiments, the second withdraw request may further include a request to transfer the first amount of fiat-backed digital assets from a fiat-backed digital asset issuer (e.g., an administrator) public address to the first designated public address. In embodiments, the second withdraw request may further include a request to generate the first amount of fiat-backed digital assets and, after printing the first amount of fiat backed digital assets, assigning the new fiat-backed digital assets to the first designated public address. In embodiments, the second withdraw request may further include a request to generate the first amount of fiat-backed digital assets and, after printing the first amount of fiat backed digital assets, assigning the new fiat-backed digital assets to the first designated public address. The process of issuing fiat-backed digital assets may be similar to the processes discussed in connection with FIGS. 18A-18F, 20A, 20A-1, 20B-20C, 21A-21B, 39A-39E, 43A-43B, and 44, the descriptions of which applying herein. In embodiments, the fiat-backed digital asset issuer may issue fiat-backed digital assets in response to fluctuations in demand of the fiat-backed digital asset. For example, if the demand of the fiat-backed digital asset increases, the fiat-backed digital asset issuer may print fiat-backed digital assets. Continuing the example, the fiat-backed digital asset issuer may print fiat-backed digital assets in proportion to the increase in demand. Alternatively, the fiat-backed digital asset issuer may print fiat-backed digital assets based on a predetermined number, instructions, rules associated with printing fiat-backed digital assets, and/or not in proportion to the increase of demand, to name a few. As another example, if the demand of the fiat-backed digital asset decreases, the fiat-backed digital asset issuer may burn flat-backed digital assets. Continuing the example, the fiat-backed digital asset issuer may burn fiat-backed digital assets in proportion to the decrease in demand. Alternatively, the fiat-backed digital asset issuer may burn fiat-backed digital assets based on a predetermined number, instructions, rules associated with burning fiat-backed digital assets, and/or not in proportion to the decrease of demand, to name a few. In embodiments, the fiat-backed digital asset issuer may require that a commensurate fiat and/or asset(s) deposit be made to account for the printed fiat-backed digital asset.

In embodiments, after receiving the second withdrawal request, the digital asset exchange computer system may verify the second withdrawal request. Verifying the second withdrawal request may include confirming one or more of the following: the validity of the first user public address, the amount of fiat owned by the first user, that the first user owns at least the second amount of fiat, and/or the designated public address is not prohibited from receiving a fiat-backed digital assets on behalf of the first user, to name a few. For example, to confirm the first user public address, the digital asset exchange computer system may compare the first user public address to a verified first user public address stored by the digital asset exchange computer system. Continuing the example, if the first user public address is the same as the verified first user public address, the first user public address may be verified. If the first user public address is not the same as the verified first user public address, the second withdraw request may be denied and/or a notification may be generated and sent by the digital asset exchange computer system to the first user device. The notification may indicate that the first user public address was not verified and the withdrawal request is denied. As another example, if the second withdrawal request includes a designated public address, the digital asset exchange computer system may verify whether the designated address is on a whitelist associated with the first user. Continuing the example, if the first user is associated with a whitelist, the digital asset exchange computer system may compare the designated public address to the whitelist. If the designated public address is on the whitelist, the designated public address may be verified. If the designated public address is not on the whitelist and thus is not verified, the second withdrawal request may be denied and/or a notification may be generated and sent by the digital asset exchange computer system to the first user device and/or a second user device associated with the first user. The notification may indicate that the designated public address is not authorized to receive fiat-backed digital assets on behalf of the first user and the withdraw request has been denied. The process of verifying designated addresses in the context of a whitelist may be similar to the process described in connection with FIG. 45, the description of which applying herein.

As described above and continuing the processes, the withdrawal request may be a request to withdraw an asset-backed digital asset in exchange for currency (e.g., an asset). The process for obtaining a withdraw request for an amount of asset-backed digital asset may continue from step S4822 and continue with step S4824". At step S4824", in embodiments, the digital asset exchange computer system may receive a second electronic withdrawal request of a first amount of asset-backed digital assets. The second electronic withdrawal request may include one or more of the following: an amount of asset-backed digital assets to withdraw (e.g., the first amount of asset-backed digital assets); a designated public address on the disturbed transaction ledger of which the withdrawal of asset-backed digital assets is directed towards; and/or a timestamp, to name a few. The timestamp, in embodiments, may be one or more timestamps indicating one or more of the following: the time and/or date at which the second withdrawal request was sent, the time and/or date at which the second withdrawal request was received, and/or the time and/or date the first user wishes to withdraw the first amount of asset-backed digital assets, to name a few. In embodiments, the second withdrawal request may be made via a secure channel, such as an encrypted communication. For example, the second withdrawal request may be encrypted using an asymmetric key, such as a PKI key, or using a symmetric key, such as used in TLS, to name a few. The second withdrawal request, in embodiments, may be encrypted by the sender (e.g., the first user device) and/or the recipient (e.g., the digital asset exchange computer system), to name a few.

As described above and continuing the processes, the withdrawal request may be a request to withdraw a stable value digital asset in exchange for currency (e.g., a second digital asset). The process for obtaining a withdraw request for an amount of stable value digital asset (e.g., backed by a second digital asset and/or a basket of digital assets—the asset(s) being maintained on the same blockchain or different blockchain than the stable value digital asset) may continue with step S4824'. At step S4824', in embodiments, the digital asset exchange computer system may receive a second electronic withdrawal request of a first amount of stable value digital assets. The second electronic withdrawal request may include one or more of the following: an amount of stable value digital assets to withdraw (e.g., the first amount of stable value digital assets); a designated public address on the disturbed transaction ledger of which the withdrawal of stable value digital assets is directed towards; and/or a timestamp, to name a few. The timestamp, in embodiments, may be one or more timestamps indicating one or more of the following: the time and/or date at which the second withdrawal request was sent, the time and/or date at which the second withdrawal request was received, and/or the time and/or date the first user wishes to withdraw the first amount of stable value digital assets, to name a few. In embodiments, the second withdrawal request may be made via a secure channel, such as an encrypted communication. For example, the second withdrawal request may be encrypted using an asymmetric key, such as a PKI key, or using a symmetric key, such as used in TLS, to name a few. The second withdrawal request, in embodiments, may be encrypted by the sender (e.g., the first user device) and/or the recipient (e.g., the digital asset exchange computer system), to name a few.

Referring to FIG. 48A, the process of withdrawing fiat-backed digital assets from a digital asset exchange may continue with step S4806. At step S4806, the digital asset exchange computer system may process the withdraw request—in the context of this embodiment—the second electronic withdraw request (or the second withdraw request). In embodiments, the digital asset exchange computer system may process the second withdraw request by performing the steps illustrated in FIG. 48D.

Figure 48D:
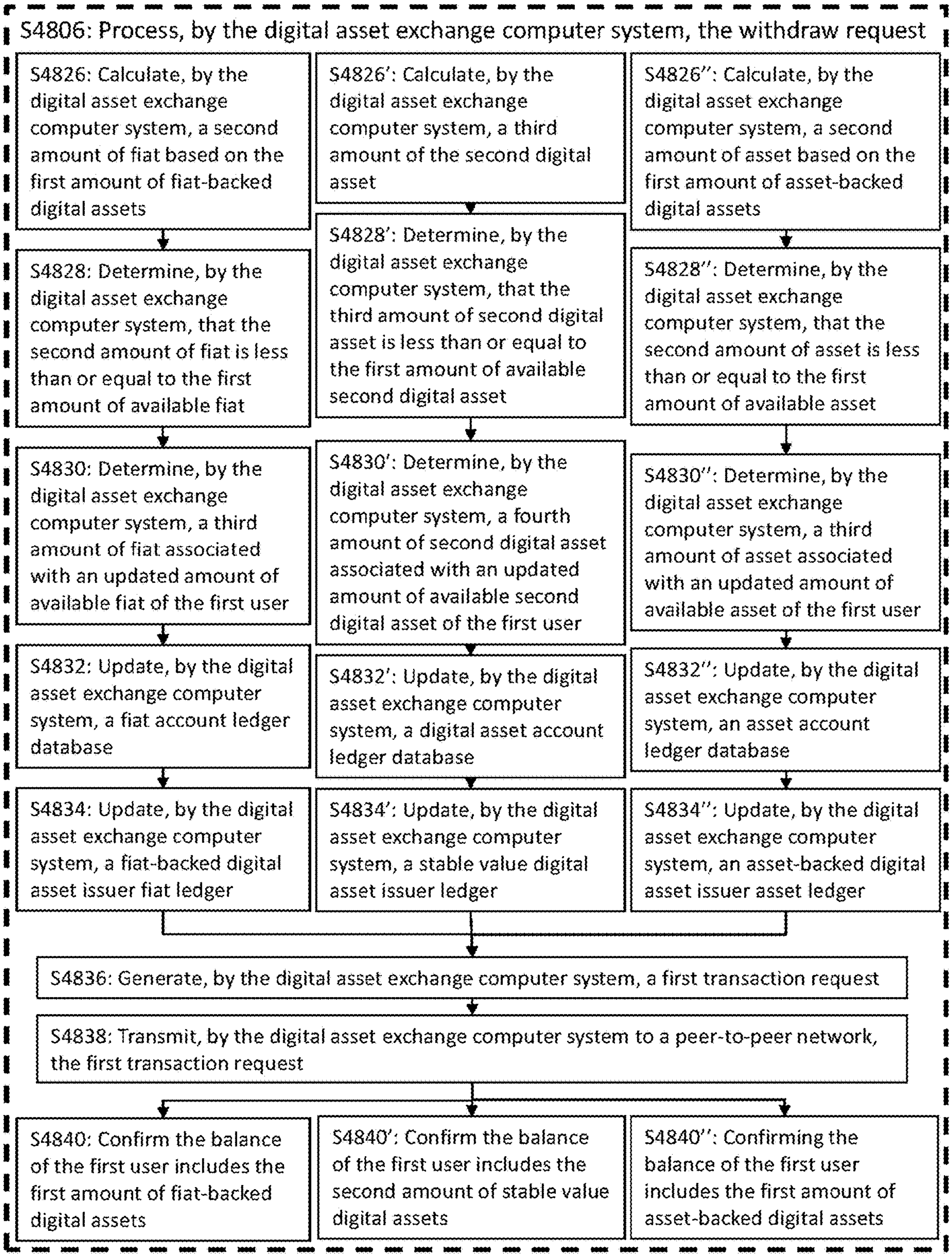

Referring to FIG. 48D, processing the second withdraw request may begin at step S4826. At step S4826, the digital asset exchange computer system may calculate a second amount of fiat based on the first amount of fiat-backed digital assets. In embodiments, the second amount of fiat may equal the fiat value of the fiat-backed digital assets, which, in embodiments, may be calculated based on an exchange rate of fiat-backed digital assets to fiat. In embodiments, the digital asset exchange computer system may utilize an exchange module (which may be operatively connected to the digital asset exchange computer system) to calculate the conversion between fiat and the fiat-backed digital asset. The exchange rate may be based on the value of the asset or assets that back the fiat-backed digital asset, which may be updated periodically, aperiodically, in real-time, in substantially real-time, and/or on predetermined intervals, to name a few. In embodiments an exchange module may display and/or otherwise communicate one or more exchange rates and/or the value of the fiat-backed digital asset in fiat. In embodiments, the exchange rate may be based on the type of fiat the user wishes to pay for fiat-backed digital assets and/or the type of digital asset located in the account associated with the user. In embodiments the exchange rate may be a fixed exchange rate. For example, the exchange rate may be one flat-backed digital asset equals one U.S. Dollar. As another example, the exchange rate may be 100 fiat-backed digital assets is equal to one U.S. Dollar. In embodiments, the exchange rate may be a fluctuating exchange rate. For example, the fluctuation exchange rate (e.g., variable exchange rate) may be based on market conditions.

As described above and continuing the processes, the second withdrawal request may be a request to withdraw a first sum of asset-backed digital asset in exchange for currency (e.g., an asset). The process for processing the second withdrawal request may continue with step S4826". At step S4826", in embodiments, the digital asset exchange computer system may calculate a second amount of asset based on the first amount of asset-backed digital assets. In embodiments an asset and an asset-backed digital asset may be related by a fixed predetermined ratio (e.g., 1 asset-backed digital asset=1 asset). In embodiments, the second amount of asset may equal the asset value of the asset-backed digital assets, which, in embodiments, may be calculated based on an exchange rate of asset-backed digital assets to asset. In embodiments, the digital asset exchange computer system may utilize an exchange module (which may be operatively connected to the digital asset exchange computer system) to calculate the conversion between asset and the asset-backed digital asset. The exchange rate may be based on the value of the asset or assets that back the asset-backed digital asset, which may be updated periodically, aperiodically, in real-time, in substantially real-time, and/or on predetermined intervals, to name a few. In embodiments an exchange module may display and/or otherwise communicate one or more exchange rates and/or the value of the asset-backed digital asset in asset. In embodiments, the exchange rate may be based on the type of asset the user wishes to pay for asset-backed digital assets and/or the type of digital asset located in the account associated with the user. In embodiments the exchange rate may be a fixed exchange rate. For example, the exchange rate may be one asset-backed digital asset equals ten assets. As another example, the exchange rate may be 100 asset-backed digital assets is equal to one asset. In embodiments, the exchange rate may be a fluctuating exchange rate. For example, the fluctuation exchange rate (e.g., variable exchange rate) may be based on market conditions.

As described above and continuing the processes, the second withdrawal request may be a request to withdraw a first sum of stable value digital asset in exchange for currency (e.g., a second digital asset, fiat, asset, to name a few). The process for processing the second withdrawal request may continue with step S4826'. At step S4826', in embodiments, the digital asset exchange computer system may calculate a third amount of the second digital asset. In embodiments a stable value digital asset and a second digital asset (e.g., maintained on the same blockchain as the stable value digital asset or maintained on a separate blockchain from the blockchain that maintains the stable value digital asset) may be related by a fixed predetermined ratio (e.g., 1 stable value digital asset=1 second digital asset). In embodiments, the second amount of second digital asset may equal the asset value of the stable value digital assets, which, in embodiments, may be calculated based on an exchange rate of stable value digital asset to second digital asset. In embodiments, the digital asset exchange computer system may utilize an exchange module (which may be operatively connected to the digital asset exchange computer system) to calculate the conversion between second digital asset and stable value digital asset. The exchange rate may be based on the value of the second digital asset or two or more types of digital assets (e.g., a basket of digital assets) that back the stable value digital asset, which may be updated periodically, aperiodically, in real-time, in substantially real-time, and/or on predetermined intervals, to name a few. In embodiments an exchange module may display and/or otherwise communicate one or more exchange rates and/or the value of the stable value digital asset in second digital asset units. In embodiments, the exchange rate may be based on the type of currency (e.g., digital asset, fiat, asset, and/or a combination thereof) the user wishes to pay for stable value digital assets and/or the type of digital asset located in the account associated with the user. In embodiments the exchange rate may be a fixed exchange rate. For example, the exchange rate may be one stable value digital asset equals five second digital assets. As another example, the exchange rate may be 50 stable value digital assets is equal to 1 second digital asset.

Processing the second withdraw request may continue at step S4828, S4828' and/or S4828". At step S4828, in embodiments, the digital asset exchange computer system determines that the second amount of fiat is either less than the first amount of available fiat or equal to the first amount of available fiat. The digital asset exchange computer system, in embodiments at step S4828' may determine that the second amount of second digital asset is either less than the first amount of second digital asset or equal to the first amount of second digital asset. Similarly, in embodiments, at step S4828" the digital asset exchange computer system may determine that the second amount of asset is either less than the first amount of asset or equal to the first amount of asset. In embodiments, the digital asset exchanged computer system may compare the second amount of fiat (second digital asset, and/or asset) to the first amount of available fiat (second digital asset, and/or asset) to make the determination regarding whether the first user has sufficient funds to withdraw the first amount of fiat-backed digital asset (stable value digital asset and/or asset-backed digital asset). If, in embodiments, the first amount of available fiat (second digital asset, and/or asset) is less than the second amount of fiat (second digital asset, and/or asset), the digital asset exchange computer system may determine that the first user has insufficient funds to complete the withdrawal. If the first user has insufficient funds, the process of FIGS. 48A-48D may stop here and/or, in embodiments, the digital asset exchange computer system may generate and send a notification to the first user device, indicating insufficient funds. In embodiments, a notification may be sent to a second user device associated with the first user, the notification indicating insufficient funds. In embodiments, the notification may be made via a secure channel, such as an encrypted communication. For example, the notification may be encrypted using an asymmetric key, such as a PKI key, or using a symmetric key, such as used in TLS, to name a few. The notification, in embodiments, may be encrypted by the sender (e.g., the digital asset exchange computer system) and/or the recipient (e.g., the first user device), to name a few.

Processing the second withdraw request may continue at step S4830. At step S4830, the digital asset exchange computer system may determine a third amount of fiat associated with an updated amount of available fiat of the first user. The third amount of fiat, in embodiments, may correspond to an amount of fiat the first user may own after the withdraw request is executed and/or committed. To determine the third amount, the digital asset exchange computer system may subtract the second amount of fiat from the first amount of available fiat. For example, if the first amount of available fiat is 100 Dollars and the second amount of flat is 75 Dollars, the third amount of fiat, in this example, would be 25 Dollars. In embodiments, the withdrawal request may have one or more fees associated with executing and/or committing the withdrawal request. These fees (e.g., transaction fees), may be represented as an amount of fiat-backed digital asset or an amount of fiat, or both. For example, if the first amount of available fiat is 100 Dollars, the second amount of fiat is 75 Dollars, and the transaction fee is 1 Dollar, the third amount of fiat, in this example, would be 24 Dollars.

Similarly, at step S4830', processing a second withdraw request for a first sum of stable value digital assets may continue with the digital asset exchange computer system determining a fourth amount of second digital asset associated with an updated amount of available second digital asset. As described above in connection with step S4830, the third amount of second digital asset, in embodiments, may correspond to an amount of second digital asset the first user may own after the withdraw request is executed and/or committed (e.g., after the second amount of second digital asset is exchanged for the first sum of stable value digital asset). To determine the third amount, the digital asset exchange computer system may subtract the second amount of second digital asset from the first amount of available second digital asset.

In embodiments, at step S4830", processing a second withdraw request for a first sum of asset-backed digital assets may continue with the digital asset exchange computer system determining a third amount of asset associated with an updated amount of asset. As described above in connection with step S4830, the third amount of asset, in embodiments, may correspond to an amount of asset the first user may own after the withdraw request is executed and/or committed (e.g., after the second amount of asset is exchanged for the first sum of asset-backed digital asset). To determine the third amount, the digital asset exchange computer system may subtract the second amount of asset from the first amount of available asset.

Processing the second withdraw request may continue at step S4832. At step S4832, the digital asset exchange computer system may update a fiat account ledger database. In embodiments, the update to the fiat account ledger database may be to account for the second amount of fiat associated with the second withdraw request. The fiat account ledger, in embodiments, may be stored on computer readable member accessible by the digital asset exchange computer system. The fiat account ledger, in embodiments, may include one or more of the following: the amount of fiat each user owns in the custody of the digital asset exchange computer system; the total amount of fiat in the custody of the digital asset exchange computer system; the total amount of fiat that the digital asset exchange and/or digital asset exchange computer system owns; transactions associated with each user and/or fiat; and/or transactions associated with the digital asset exchange and/or digital asset exchange computer system and/or fiat, to name a few.

In embodiments where the withdraw request is for asset-backed digital assets, at step S4832", the digital asset exchange computer system may update an asset account ledger database (which may be similar to the fiat account ledger database, the description of which applying herein) to account for the second amount of asset associated with the second withdraw request. The asset account ledger, in embodiments, may include one or more of the following: the amount of asset each user owns in the custody of the digital asset exchange computer system; the total amount of asset in the custody of the digital asset exchange computer system; the total amount of asset that the digital asset exchange and/or digital asset exchange computer system owns; transactions associated with each user and/or asset; and/or transactions associated with the digital asset exchange and/or digital asset exchange computer system and/or asset, to name a few.

In embodiments where the withdraw request is for stable value digital assets, at step S4832', the digital asset exchange computer system may update a digital asset account ledger database (which may be similar to the fiat account ledger database, the description of which applying herein) to account for the second amount of second digital asset associated with the second withdraw request. The digital asset account ledger, in embodiments, may include one or more of the following: the amount of second digital asset each user owns in the custody of the digital asset exchange computer system; the total amount of second digital asset in the custody of the digital asset exchange computer system; the total amount of second digital asset that the digital asset exchange and/or digital asset exchange computer system owns; transactions associated with each user and/or second digital asset; and/or transactions associated with the digital asset exchange and/or digital asset exchange computer system and/or second digital asset, to name a few.

Processing the second withdraw request may continue at step S4834. At step S4834, the digital asset exchange computer system may update a fiat-backed digital asset issuer fiat ledger. In embodiments, the update to the fiat-backed digital asset issuer fiat ledger may be to account for the second amount of fiat associated with the second withdraw request. In embodiments, the fiat-backed digital asset issuer fiat ledger may be associated with a fiat-backed digital asset issuer (e.g., the issuer of the fiat-backed digital asset associated with the process described herein). In embodiments, the fiat-backed digital asset issuer fiat ledger may be updated by the digital asset exchange computer system sending a request to the fiat-backed digital asset issuer. The request, in embodiments, may include a request to update the fiat-backed digital asset issuer fiat ledger. In response to receiving the request, the fiat-backed digital asset issuer may update their fiat-backed digital asset issuer fiat ledger.

In embodiments, the digital asset exchange computer system may also transfer the second amount of fiat to the fiat-backed digital asset issuer (e.g., from an account on the peer-to-peer network associated with the digital asset exchange to an account on the peer-to-peer network associated with the fiat-backed digital asset issuer). In embodiments, the digital asset exchange computer system may transfer the second amount of fiat before, with, or after the request to update the fiat-backed digital asset issuer fiat ledger is sent to the fiat-backed digital asset issuer. In embodiments, the digital asset exchange computer system may periodically transfer fiat from an account on the peer-to-peer network associated with the digital asset exchange to an account on the peer-to-peer network associated with the fiat-backed digital asset issuer. The periodic transfers may be made at defined time intervals. The defined time intervals may be defined based on: the amount of fiat that is due to be transferred from the digital asset exchange computer system to the fiat-backed digital asset issuer; the amount of transactions including fiat; the processing capabilities of the fiat-backed digital asset issuer and/or the digital asset exchange computer system; and/or one or more government regulations, to name a few. For example, the digital asset exchange computer system may transfer fiat to the fiat-backed digital asset issuer once the digital asset exchange computer system is in custody of $50,000 owned by the flat-backed digital asset issuer. In embodiments, the defined time intervals may be predetermined times throughout each day, week, month, and/or year, to name a few. For example, the digital asset exchange computer system may periodically transfer fiat from an account on the peer-to-peer network associated with the digital asset exchange to an account on the peer-to-peer network associated with the fiat-backed digital asset issuer every day at 2:00 PM EST.

In embodiments where the second withdraw request is for a first sum of asset-backed digital assets, in embodiments, the process may continue with step S4834". At step S4834", in embodiments, the digital asset exchange computer system may update an asset-backed digital asset issuer asset ledger. In embodiments, the update to the asset-backed digital asset issuer asset ledger may be to account for the second amount of asset associated with the second withdraw request. In embodiments, the asset-backed digital asset issuer asset ledger may be associated with an asset-backed digital asset issuer (e.g., the issuer of the asset-backed digital asset associated with the process described herein). In embodiments, the asset-backed digital asset issuer fiat ledger may be updated by the digital asset exchange computer system sending a request to the asset-backed digital asset issuer. The request, in embodiments, may include a request to update the asset-backed digital asset issuer fiat ledger. In response to receiving the request, the asset-backed digital asset issuer may update their asset-backed digital asset issuer asset ledger. In embodiments, the request may be made via a secure channel, such as an encrypted communication. For example, the request may be encrypted using an asymmetric key, such as a PKI key, or using a symmetric key, such as used in TLS, to name a few. The request, in embodiments, may be encrypted by the sender (e.g., the digital asset exchange computer system) and/or the recipient (e.g., the asset-backed digital asset issuer), to name a few.

In embodiments, the digital asset exchange computer system may also transfer the second amount of asset to the asset-backed digital asset issuer (e.g., from an account on the peer-to-peer network associated with the digital asset exchange to an account on the peer-to-peer network associated with the asset-backed digital asset issuer). In embodiments, the digital asset exchange computer system may transfer the second amount of asset before, with, or after the request to update the asset-backed digital asset issuer asset ledger is sent to the asset-backed digital asset issuer. In embodiments, the digital asset exchange computer system may periodically transfer asset from an account on the peer-to-peer network associated with the digital asset exchange to an account on the peer-to-peer network associated with the asset-backed digital asset issuer. The periodic transfers may be made at defined time intervals. The defined time intervals may be defined based on: the amount of asset that is due to be transferred from the digital asset exchange computer system to the asset-backed digital asset issuer; the amount of transactions including asset; the processing capabilities of the asset-backed digital asset issuer and/or the digital asset exchange computer system; and/or one or more government regulations, to name a few.

In embodiments where the second withdraw request is for a first sum of stable value digital assets, in embodiments, the process may continue with step S4834'. At step S4834', in embodiments, the digital asset exchange computer system may update a digital asset issuer second digital asset ledger. In embodiments, the update to the digital asset issuer second digital asset ledger may be to account for the second amount of second digital asset associated with the second withdraw request. In embodiments, the digital asset issuer second digital asset ledger may be associated with a stable value digital asset issuer (e.g., the issuer of the stable value digital asset associated with the process described herein). In embodiments, the digital asset issuer second digital asset ledger may be updated by the digital asset exchange computer system sending a request to the asset-backed digital asset issuer. The request, in embodiments, may include a request to update the digital asset issuer second digital asset ledger. In response to receiving the request, the stable value digital asset issuer may update their digital asset issuer second digital asset ledger. In embodiments, the request may be made via a secure channel, such as an encrypted communication. For example, the request may be encrypted using an asymmetric key, such as a PKI key, or using a symmetric key, such as used in TLS, to name a few. The request, in embodiments, may be encrypted by the sender (e.g., the digital asset exchange computer system) and/or the recipient (e.g., the asset-backed digital asset issuer), to name a few.

In embodiments, the digital asset exchange computer system may also transfer the second amount of second digital asset to the stable value digital asset issuer (e.g., from an account on the peer-to-peer network and/or second peer-to-peer network associated with the digital asset exchange to an account on the peer-to-peer network and/or second peer-to-peer network associated with the stable value digital asset issuer). In embodiments, the digital asset exchange computer system may transfer the second amount of second digital asset before, with, or after the request to update the digital asset issuer second digital asset ledger is sent to the stable value digital asset issuer. In embodiments, the digital asset exchange computer system may periodically transfer second digital assets from an account on the peer-to-peer network associated with the digital asset exchange to an account on the peer-to-peer network associated with the asset-backed digital asset issuer. The periodic transfers may be made at defined time intervals. The defined time intervals may be defined based on. the amount of asset that is due to be transferred from the digital asset exchange computer system to the stable value digital asset issuer; the amount of transactions including second digital asset; the processing capabilities of the stable value digital asset issuer and/or the digital asset exchange computer system; and/or one or more government regulations, to name a few.

Processing the second withdraw request (e.g., request to withdraw the first sum of fiat-backed digital assets, the first sum of asset-backed digital assets, and/or the first sum of stable value digital assets, to name a few) may continue at step S4836. At step S4836, in embodiments the digital asset exchange computer system may generate a first transaction request. The first transaction request, in embodiments, may include a first message that includes a request to obtain the first amount of fiat-backed digital assets (and/or asset-backed digital assets and/or stable value digital assets, as applicable). The first message may also include instructions to transfer the obtained first amount of fiat-backed digital assets (and/or asset-backed digital assets and/or stable value digital assets, as applicable) to the first designated public address. In embodiments, the transaction request may be for the distributed transaction ledger and addressed to a contract address associated with the fiat-backed digital asset issuer (and/or asset-backed digital asset issuer and/or stable value digital asset issuer, as applicable) for the distributed transaction ledger. In embodiments, the digital exchange computer system may digitally sign the transaction request (and/or the corresponding instructions). The digital signature, in embodiments, may be based on a private key associated with the digital asset exchange computer system. The digital signature, in embodiments, may be based on one or more private keys (e.g., via MPC) associated with the digital asset exchange computer system and/or the first user device, to name a few.

In embodiments, the transaction request may include instructions to update the fiat-backed digital asset database and to reserve enough fiat-backed digital assets to cover the first amount of fiat-backed digital assets. In embodiments, the transaction request may include a digital signature associated with the digital asset exchange computer system. In embodiments, the transaction request may include a digital signature associated with a trusted entity system. The digital signature associated with the trusted entity system may be a combined digital signature based on of one or more private keys associated with one or more trusted entities of the trusted entity system. The digital signature, in embodiments, may further include one or more private keys associated with the first user.

Processing the second withdraw request (e.g., request to withdraw the first sum of fiat-backed digital assets, the first sum of asset-backed digital assets, and/or the first sum of stable value digital assets, to name a few) may continue at step S4838. At step S4838, the digital asset exchange computer system transmits the transaction request to the peer-to-peer network via a network (e.g., Network 15). The transaction request, in embodiments, may be published to the blockchain by the digital asset exchange computer system. The published transaction request may be verified by one or more nodes on the blockchain and/or executed by one or more nodes on the blockchain. In embodiments, a transaction fee may be required by one or more nodes, e.g., a miner, to verify and/or execute the generated and/or published transaction request. In embodiments, transmitting the first transaction request to the peer-to-peer network may cause the first transaction request to be published by a trusted entity system. In embodiments, the trusted entity system may publish the transaction request to the peer-to-peer network via a network (e.g., Network 15). In embodiments, publishing the transaction request may cause the peer-to-peer network to go through a process of executing and/or committing the transaction request (e.g., a consensus protocol) which may result in the transfer of the first amount of fiat-backed digital assets from the fiat-backed digital asset issuer to the first designated public address.

Processing the second withdraw request may continue at step S4840. At step S4840, the balance of the first user (e.g., the first designated public address and/or the first user public address) includes the first amount of fiat-backed digital assets. The confirmation, in embodiments, may be based on reference to the distributed transaction ledger. In embodiments, the first user public address in embodiments, may be the first designated public address. In embodiments, the digital asset exchange computer system may confirm that the first user received the fiat-backed digital assets (or the first designated public address received the first amount, in the case where the first designated public address is not associated with the first user) and received the correct amount of fiat-backed digital assets. The confirmation process may be a call/return to and from the designated public address and/or the first user public address. In embodiments, the confirmation process may be a query to the peer-to-peer network for a status of the distributed transaction ledger, which may result in a receipt of the status of the distributed transaction ledger which may include the transfer of the first amount of fiat-backed digital assets.

In embodiments where the second withdraw request is for a first sum of stable value digital assets, in embodiments, the process may continue with step S4840'. At step S4840', in embodiments, the balance of the first user is confirmed to include the second amount of stable value digital assets. In embodiments, the digital asset exchange computer system may confirm the balance of the first user on reference to the blockchain. For example, the digital asset exchange computer system may generate and publish a call (which may be digitally signed in a similar manner as described above, the description of which applying herein) to the first designated public address (and/or another address which received the stable value digital asset). The first designated public address may, continuing the example, respond by publishing a return on the blockchain. The return, in embodiments, may confirm the execution of the first transaction request (e.g., by returning a balance indicating the first sum of stable value digital asset was issued to the first designated public address).

In embodiments where the second withdraw request is for a first sum of asset-backed digital assets, in embodiments, the process may continue with step S4840". At step S4840", in embodiments, the balance of the first user is confirmed to include the second amount of asset-backed digital assets. In embodiments, the digital asset exchange computer system may confirm the balance of the first user on reference to the blockchain. For example, the digital asset exchange computer system may generate and publish a call (which may be digitally signed in a similar manner as described above, the description of which applying herein) to the first designated public address (and/or another address which received the asset-backed digital asset). The first designated public address may, continuing the example, respond by publishing a return on the blockchain. The return, in embodiments, may confirm the execution of the first transaction request (e.g., by returning a balance indicating the first sum of asset-backed digital asset was issued to the first designated public address).

The steps of the processes described in connection with FIGS. 48A-48D may be rearranged or omitted.

Figure 49A:
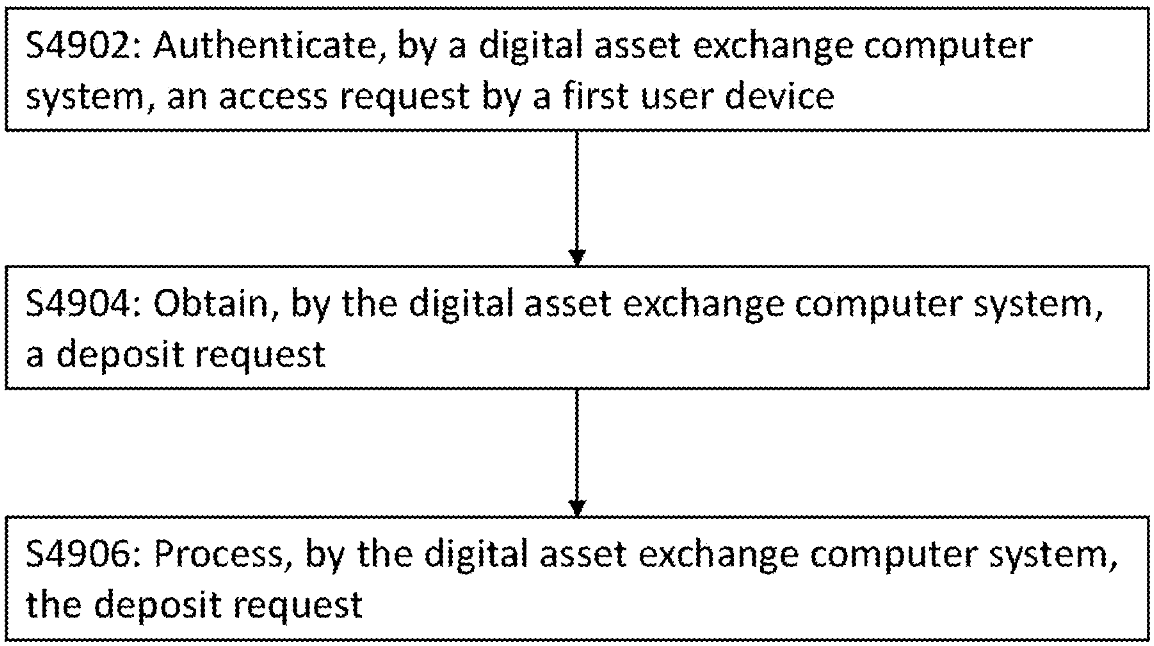
Figure 49B:
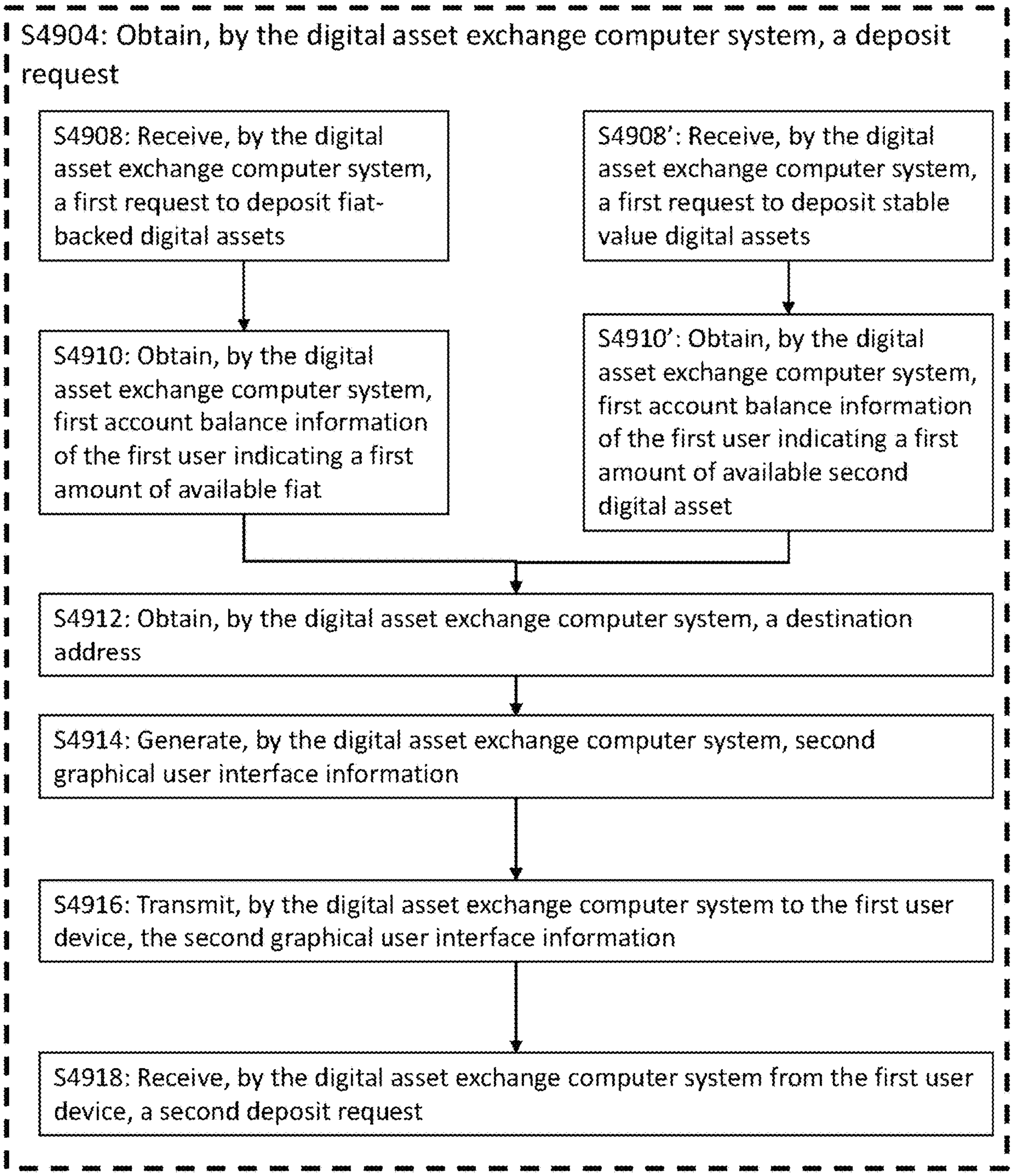
Figure 49C:
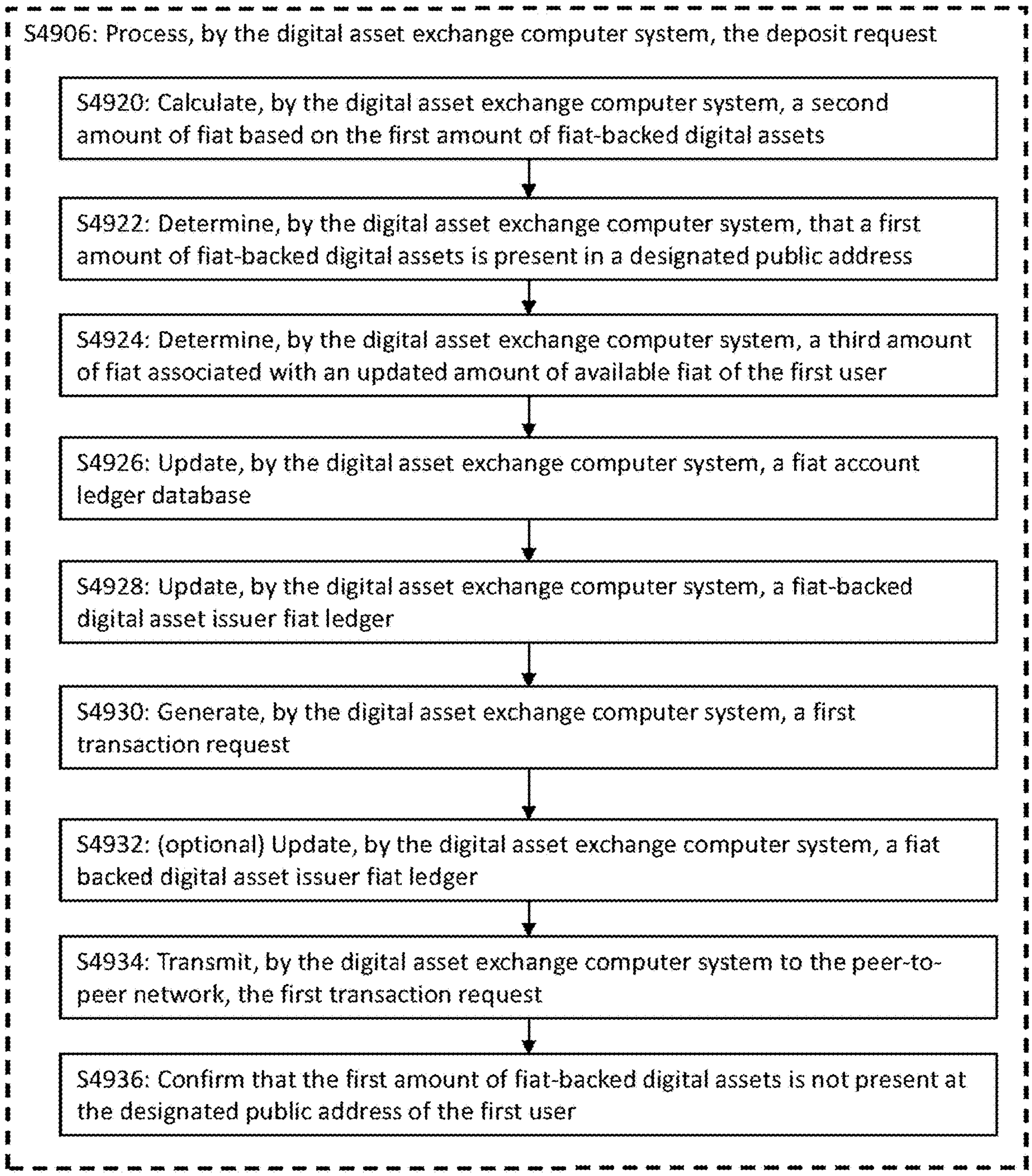
Figures 1, 49C:
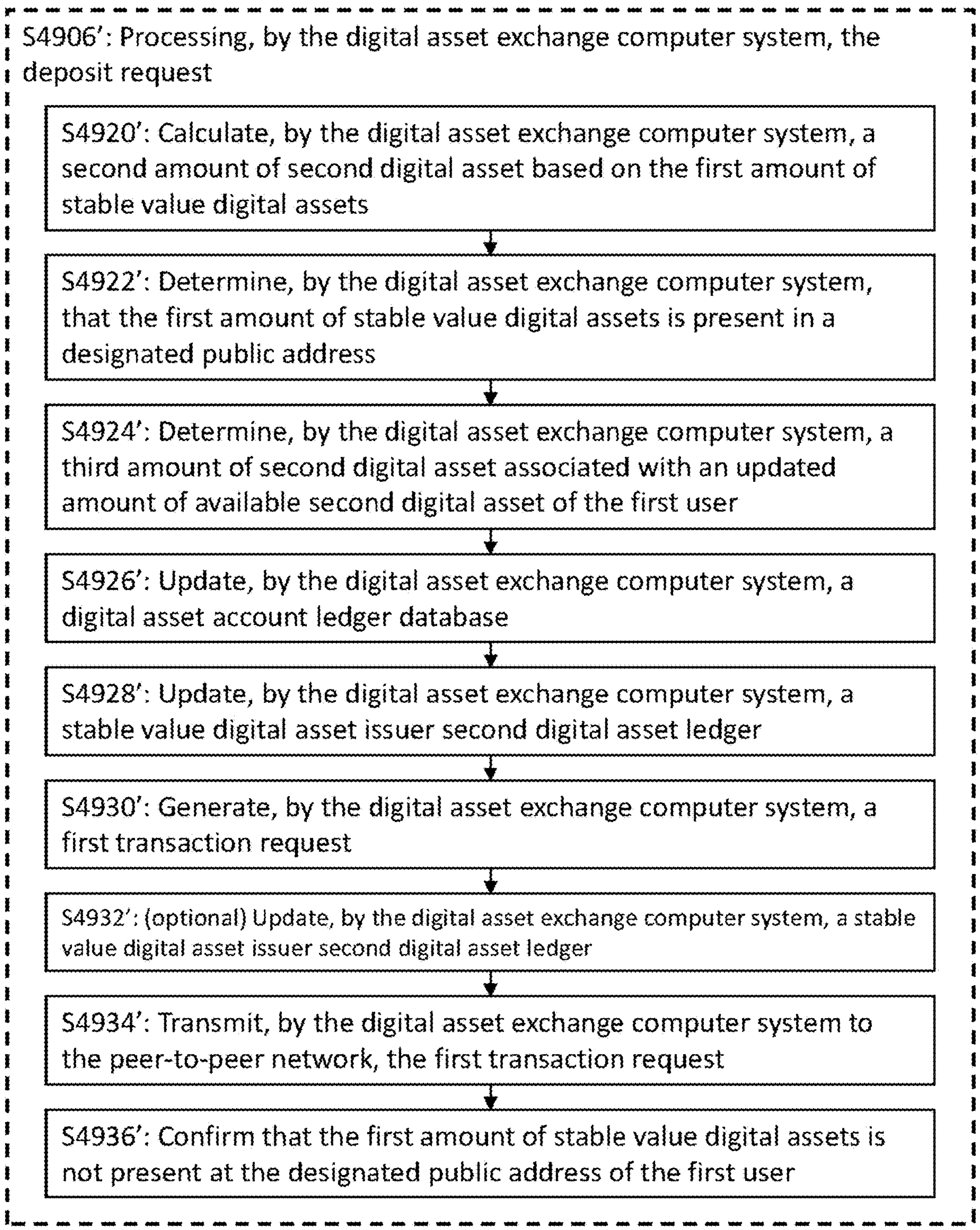

FIGS. 49A-49C illustrate embodiments of depositing/redeeming asset-backed digital assets in exchange for currency (an asset which may include fiat and/or cryptocurrency, fiat, digital asset, a basket of fiat and/or digital asset, and/or a combination thereof, to name a few). In embodiments, the asset-backed digital asset may be: a fiat-backed digital asset token (e.g., a Gemini Dollar), a stable value digital asset token, and/or LIBRA, to name a few. In embodiments, the asset-backed digital assets may be similar to the asset-backed digital assets described above in connection with FIGS. 48A-48D, the description of which applying herein. The process of depositing asset-backed digital assets as described in connection with FIGS. 49A-49C may be similar to the process described in connection with FIGS. 17A-17E, the description of which applying herein.

Referring to FIG. 49A, a process for depositing fiat-backed digital assets (and/or asset-backed digital assets and/or stable value digital assets) may begin at step S4902. At step S4902 the digital asset exchange computer system may authenticate an access request by a first user device. In embodiments, the first user device may be associated with a first user. In embodiments the digital asset exchange computer system may be associated with a digital asset exchange. In embodiments the digital asset exchange computer system may be operably connected with the digital asset exchange. In embodiments the first user device, digital asset exchange computer system, and the digital asset exchange may be similar to the first user device, digital asset exchange computer system, the digital asset exchange discussed above with respect to FIGS. 48A-48D, the descriptions of which respectively applying herein. The process for authenticating an access request by a first user device may be similar to the process described above in connection with FIG. 48B, the description of which applying herein. In embodiments, the digital asset exchange computer system may determine whether the first user is a registered user of the digital asset exchange. The process for determining whether the first user is a registered user may be similar to the process for determining whether the first user is a registered user, discussed above with respect to FIGS. 48A-48D, the description of which applying herein. In embodiments, the digital asset exchange may be licensed by a government regulatory authority.

The process for depositing an amount of fiat-backed digital asset into a digital asset exchange computer system may continue with step S4904. At step S4904, the digital asset exchange computer system obtains a deposit request. In embodiments, a process for obtaining a deposit request may be performed by the steps illustrated in FIG. 49B. Referring to FIG. 49B, FIG. 49B provides a detailed illustration of exemplary processes for obtaining such a deposit request which may be used in accordance with exemplary embodiments of step S4904. The process of FIG. 49B may begin at step S4908 and/or step S4908'. At step S4908 the digital asset exchange computer system receives a first request to deposit a first amount of fiat-backed digital assets (and/or asset-backed digital assets). At step S4908', in embodiments, the digital asset exchange computer system may receive a first request to deposit stable value digital assets. In embodiments, the digital asset exchange computer system may obtain the deposit request by receiving a deposit request from the first user device via a network. In embodiments, the deposit request may be made via a secure channel, such as an encrypted communication. For example, the deposit request may be encrypted using an asymmetric key, such as a PKI key, or using a symmetric key, such as used in TLS, to name a few. The deposit request, in embodiments, may be encrypted by the sender (e.g., the first user device) and/or the recipient (e.g., the digital asset exchange computer system), to name a few.

In embodiments, the fiat-backed digital asset may be tied to a distributed transaction ledger which may be maintained on a peer-to-peer network that includes a plurality of geographically distributed computer systems. In embodiments, the distributed transaction ledger may be public, private, semi-private, and/or semi-public, to name a few. For example, the distributed transaction ledger may be published publicly available to anyone who wants to see it. As another example, the distributed transaction ledger may not be published and, to be able to access the distributed transaction ledger, a user may send a query the peer-to-peer network.

The peer-to-peer network, in embodiments, may be: the ETHEREUM Network, the LIBRA Network, the NEO Network, the BITCOIN network, and/or the STELLAR Network, to name a few. The peer-to-peer network, in embodiments, may be based on a mathematical protocol for proof of work. The peer-to-peer network, in embodiments, may be based on a mathematical protocol for proof of stake. The peer-to-peer network, in embodiments, may be based on a cryptographic mathematical protocol. In embodiments, the peer-to-peer network may be based on a mathematical protocol that is open sourced. In embodiments, the digital asset security token database, in embodiments, may be stored on computer readable media associated with a digital asset security token issuer system (e.g., memory of the digital asset security token issuer system). In embodiments, the digital asset security token database may be maintained and stored on the plurality of geographically distributed computer systems in the peer-to-peer network.

In embodiments, the distributed transaction ledger may include a fiat-backed digital asset database. In embodiments, the fiat-backed digital asset data base may be maintained on a sidechain. A sidechain, in embodiments, may refer to a portion of the distributed transaction ledger. For example, an administrator, user, and/or trusted entity may maintain a portion of the distributed transaction ledger and/or an electronic copy of a portion of the distributed transaction ledger. In embodiments, a portion of the distributed transaction ledger, in the context of a Merkel Tree, may refer to one or more "leafs" of the Merkel Tree, one or more statuses of the Merkel Tree, and/or a complete Merkel Tree with one or more past transactions being "pruned." In the context of a blockchain, the portion of the distributed transaction ledger may be one or more blocks of the blockchain. The information on the sidechain may be updated periodically or aperiodically. For example, the information on the sidechain may be updated, published, and stored on the peer-to-peer network at predetermined times (e.g., twice a day, once a day, once a week, once a month, and/or once a quarter, to name a few). As another example, the information on the sidechain may be updated, published and stored on the peer-to-peer network after the execution of a transaction and/or the execution of a batch of transactions. As yet another example, the information on the sidechain may be updated, published and stored on the peer-to-peer network after the commitment of a transaction and/or the commitment of a batch of transactions. A transaction, for example, may be committed by a consensus of trusted entities of the peer-to-peer network.

In embodiments, the peer-to-peer network may utilize one or more protocols and/or programs for security purposes. For example, the peer-to-peer network may utilize a byzantine fault tolerance protocol as a consensus mechanism. As another example, the peer-to-peer network may utilize a whitelist for the execution of a transaction and/or the transfer of funds. As yet another example, the peer-to-peer network may also utilize one or more of the following: encryption, point-to-point encryption, two-factor authentication, and/or tokenization, to name a few.

The process of obtaining a deposit request may continue with step S4910. At step S4910, in response to the first request, the digital asset exchange computer system obtains account balance information for a first user where the account balance information indicates an amount of available fiat of the first user. In embodiments, the account balance information may be obtained from a fiat account ledger database and/or the distributed transaction ledger. The fiat account ledger database, in embodiments, may indicate how much fiat (e.g., U.S. Dollars) the first user has available for use and/or owns. For example, the fiat-account ledger database may indicate the first user has a first amount of available fiat. In embodiments the account balance information may include first fiat-backed digital asset account balance information of the first user. The first fiat-backed digital asset account balance information may indicate a balance of fiat-backed digital assets that are owned by the first user and/or available for use by the first user. For example, the first flat-backed digital asset account information may indicate that the first user has a second amount of fiat-backed digital assets available for use. In embodiments, the first amount of available fiat and/or the second amount of fiat-backed digital assets may be in the custody of the digital asset exchange computer system and/or the digital asset exchange. In embodiments, the fiat account ledger database may be stored on computer readable memory accessible by the digital asset exchange computer system. In embodiments, the digital asset exchange computer system may obtain and/or store a copy of the distributed transaction ledger on computer readable memory accessible by the digital asset exchange computer system.

The process for obtaining a withdraw request for an amount of stable value digital asset (e.g., backed by a second digital asset and/or a basket of digital assets—the asset(s) being maintained on the same blockchain or different blockchain than the stable value digital asset) may continue with step S4910'. At step S4910', in embodiments, the digital asset exchange computer system may obtain first account balance information of the first user indicating a first amount of available second digital asset. The first account balance may, in embodiments, indicate a first amount of available second digital asset. The first amount of available second digital asset may be second digital asset owned by the first user held in an account associated with the first user and the digital asset exchange computer system (and/or held in the custody of the digital asset exchange computer system on behalf of the first user). In embodiments, the first amount of available second digital asset may be owned by the first user and in the custody of the digital asset exchange computer system and/or the digital asset exchange. In embodiments, the first account balance information may be stored on an asset ledger associated with the digital asset exchange computer system (e.g., electronic ledger data 5116). Obtaining an account balance may be similar to the descriptions of obtaining an account balance described throughout this application, the descriptions of which applying herein.

The process of obtaining a deposit request (e.g., a deposit request associated with fiat-backed digital assets, asset-backed digital assets, and/or stable value digital assets, to name a few), in embodiments, may continue with step S4912. At step S4912, the digital asset exchange computer system obtains a destination address. A destination address may be the public address associated with the entity the first user intends to deposit the first amount of fiat-backed digital assets. For example, the destination address may be a public address associated with the digital asset exchange computer system. The destination address, in embodiments, may be on a blockchain separate from the blockchain which maintains the stable value digital asset (e.g., FILECOIN Blockchain and ETHEREUM blockchain respectively).

The process for obtaining a deposit request (e.g., a deposit request associated with fiat-backed digital assets, asset-backed digital assets, and/or stable value digital assets, to name a few) may, in embodiments, continue with step S4914. At step S4914, the digital asset exchange computer system may generate second graphical user interface information. In embodiments, the second graphical user interface information may be for displaying a graphical user interface on the first user device. For example, the second graphical user interface information may include second machine-readable instructions representing one or more of the following: (1) a display that includes the first fiat-backed digital asset account balance information; (2) a display that includes the first account balance information: (3) a display that includes user identification information; and/or (4) a display that includes the first user's past transactions (all of the past transactions and/or a portion of the past transactions), to name a few. In embodiments, the second graphical user interface information (and/or the second machine-readable instructions) may be encrypted communication (e.g., encrypted by the digital asset exchange computer system and/or encrypted by the first user device). For example, the second graphical user interface information (and/or the second machine-readable instructions) may be encrypted using an asymmetric key, such as a PKI key, or using a symmetric key, such as used in TLS, to name a few. The second graphical user interface information (and/or second machine-readable instructions), in embodiments, may be encrypted by the sender (e.g., the digital asset exchange computer system) and/or the recipient (e.g., the first user device), to name a few.

The process of obtaining a deposit request (e.g., a deposit request associated with fiat-backed digital assets, asset-backed digital assets, and/or stable value digital assets, to name a few), in embodiments, may continue with step S4916. At step S4822, the digital asset exchange computer system may transmit the second graphical user interface information to the first user device via a network. In embodiments, upon receipt of the second graphical user interface information, the first user device displays the graphical user interface associated with the graphical user interface information on a display of the first user device. For example, the digital asset exchange computer system may send the second machine-readable instructions to the first user device, and, upon receiving the second machine-readable instructions, the first user device executes the second machine-readable instructions which may cause the second GUI to be displayed on a display screen of the first user device. In embodiments, such a transmission may be made via a secure channel, such as an encrypted communication. For example, the second graphical user interface information (and/or the second machine-readable instructions) may be encrypted using an asymmetric key, such as a PKI key, or using a symmetric key, such as used in TLS, to name a few. The second graphical user interface information (and/or second machine-readable instructions), in embodiments, may be encrypted by the sender (e.g., the digital asset exchange computer system) and/or the recipient (e.g., the first user device), to name a few.

The process for obtaining a deposit request (e.g., a deposit request associated with fiat-backed digital assets, asset-backed digital assets, and/or stable value digital assets, to name a few) may, in embodiments, continue with step S4918. At step S4918, the digital asset exchange computer system receives a second electronic deposit request of a first amount of fiat-backed digital assets. In embodiments, the second deposit request may be for a first amount of stable value digital assets and/or a first amount of asset-backed digital assets. The second electronic deposit request may include one or more of the following: an amount of fiat-backed digital assets to deposit (e.g., the first amount of fiat-backed digital assets); an amount of stable value digital assets to deposit (e.g., the first amount of stable value digital assets); an amount of asset-backed digital assets to be deposited (e.g., the first amount of asset-backed digital assets); a designated public address on the disturbed transaction ledger of which the deposit of fiat-backed digital assets is being transferred from (e.g., the first user public address); and/or a timestamp, to name a few. The timestamp, in embodiments, may be one or more timestamps indicating one or more of the following: the time and/or date at which the second deposit request was sent, the time and/or date at which the second deposit request was received, and/or the time and/or date the first user wishes to deposit the first amount of fiat-backed digital assets, stable value digital assets, and/or asset-backed digital assets, to name a few. In embodiments, the second deposit request may be digitally signed by a private key associated with the first user. The private key associated with the first user may, in embodiments, have a corresponding public key. The public key and private key, in embodiments, may be mathematically related. The public key may be associated with one or more private keys. The one or more private keys may be mathematically related to one another. In embodiments, the public key associated with the first user may be used to generate a first user public address associated with the first user. The first user public address, in embodiments, may be generated by applying a hash algorithm to the public key associated with the first user. The result of the application of the hash algorithm may, in embodiments, be the first user public address. In embodiments, the second deposit request may be made via a secure channel, such as an encrypted communication. For example, the second deposit request may be encrypted using an asymmetric key, such as a PKI key, or using a symmetric key, such as used in TLS, to name a few. The second deposit request, in embodiments, may be encrypted by the sender (e.g., the first user device) and/or the recipient (e.g., the digital asset exchange computer system), to name a few.

In embodiments, the destination public address may be associated with a public key which may have been used to generate the destination public address. For example, the digital asset address associated with the destination public address may be generated by applying a hash algorithm to the public key associated with the user associated with the destination public address. The result of the application of the hash on the public key may be the destination public address.

In embodiments, the second deposit request may further include a request to transfer the first amount of fiat-backed digital assets (and/or stable value digital assets and/or asset-backed digital assets) from the destination public address to an administrator public address associated with an issuer of the digital assets (e.g., a fiat-backed digital asset issuer, a stable value digital asset issuer, and/or an asset-backed digital asset issuer). In embodiments, the second deposit request may further include a request to burn the first amount of fiat-backed digital assets (and/or stable value digital assets and/or asset-backed digital assets). The process of burning a fiat-backed digital asset (and/or stable value digital assets and/or asset-backed digital assets) may be similar to the process described in connection with FIG. 19E, the description of which applying herein. In embodiments, the administrator (e.g., a fiat-backed digital asset issuer, a stable value digital asset issuer, and/or an asset-backed digital asset issuer) may issue and/or burn fiat-backed digital assets (and/or stable value digital assets and/or asset-backed digital assets) in response to fluctuations in demand of the fiat-backed digital asset (and/or stable value digital assets and/or asset-backed digital assets). For example, if the demand of the fiat-backed digital asset (and/or stable value digital assets and/or asset-backed digital assets) increases, the fiat-backed digital asset issuer (and/or a stable value digital asset issuer, and/or an asset-backed digital asset issuer) may print fiat-backed digital assets (and/or stable value digital assets and/or asset-backed digital assets). Continuing the example, the fiat-backed digital asset issuer may print fiat-backed digital assets in proportion to the increase in demand. Alternatively, the fiat-backed digital asset issuer may print fiat-backed digital assets based on a predetermined number, instructions, rules associated with printing fiat-backed digital assets, and/or not in proportion to the increase of demand, to name a few. As another example, if the demand of the fiat-backed digital asset decreases, the fiat-backed digital asset issuer may burn fiat-backed digital assets. Continuing the example, the flat-backed digital asset issuer may burn fiat-backed digital assets in proportion to the decrease in demand. Alternatively, the fiat-backed digital asset issuer may burn fiat-backed digital assets based on a predetermined number, instructions, rules associated with burning fiat-backed digital assets, and/or not in proportion to the decrease of demand, to name a few. In embodiments, the fiat-backed digital asset issuer may require that a commensurate fiat and/or asset(s) deposit be made to account for the printed fiat-backed digital asset.

In embodiments, after receiving the second deposit request, the digital asset exchange computer system may verify the second deposit request. Verifying the second withdrawal request may include confirming one or more of the following: the validity of the first user public address, the amount of fiat-backed digital assets owned by the first user, the amount of stable value digital assets owned by the first user, the amount of asset-backed digital assets owned by the first user, whether the first user has sufficient funds for the order (e.g., the first amount of flat-backed digital asset, stable value digital asset, and/or asset-backed digital asset), the validity of the designated public address, and/or the destination public address is not prohibited from receiving a fiat-backed digital asset (and/or stable value digital asset and/or asset-backed digital asset) on behalf of the first user, to name a few. For example, to confirm the first user public address, the digital asset exchange computer system may compare the first user public address to a verified first user public address stored by the digital asset exchange computer system. Continuing the example, if the first user public address is the same as the verified first user public address, the first user public address may be verified. If the first user public address is not the same as the verified first user public address, the second withdraw request may be denied and/or a notification may be generated and sent by the digital asset exchange computer system to the first user device. The notification may indicate that the first user public address was not verified and the withdrawal request is denied. In embodiments, a notification may be sent to a second user device associated with the first user, the notification indicating insufficient funds. In embodiments, the notification may be made via a secure channel, such as an encrypted communication. For example, the notification may be encrypted using an asymmetric key, such as a PKI key, or using a symmetric key, such as used in TLS, to name a few. The notification, in embodiments, may be encrypted by the sender (e.g., the digital asset exchange computer system) and/or the recipient (e.g., the first user device), to name a few.

As another example, if the second deposit request includes a destination public address, the digital asset exchange computer system may verify whether the destination public address is on a whitelist associated with the first user. Continuing the example, if the first user is associated with a whitelist, the digital asset exchange computer system may compare the destination public address to the whitelist. If the destination public address is on the whitelist, the destination public address may be verified. If the destination public address is not on the whitelist and thus is not verified, the second deposit request may be denied and/or a notification may be generated and sent by the digital asset exchange computer system to the first user device and/or a second user device associated with the first user. The notification may indicate that the destination public address is not authorized to receive fiat-backed digital assets on from the first user and the deposit request has been denied. In embodiments, a notification may be sent to a second user device associated with the first user, the notification indicating insufficient funds. In embodiments, the notification may be made via a secure channel, such as an encrypted communication. For example, the notification may be encrypted using an asymmetric key, such as a PKI key, or using a symmetric key, such as used in TLS, to name a few. The notification, in embodiments, may be encrypted by the sender (e.g., the digital asset exchange computer system) and/or the recipient (e.g., the first user device), to name a few. The process of verifying destination addresses in the context of a whitelist may be similar to the process described in connection with FIG. 45, the description of which applying herein.

Referring to FIG. 49A, the process for depositing an amount of fiat-backed digital asset (and/or asset-backed digital asset) into a digital asset exchange computer system may continue with step S4906. At step S4906, the digital asset exchange computer system processes the deposit request. The digital asset exchange computer system, in embodiments, may process the deposit request by performing the steps illustrated in FIG. 49C and/or FIG. 49C-1. Referring to FIG. 49C, processing the deposit request may begin at step S4920. At step S4920, the digital asset exchange computer system may calculate a second amount of fiat based on the first amount of fiat-backed digital assets. In embodiments, the second amount of fiat may equal the fiat value of the fiat-backed digital assets, which, in embodiments, may be calculated based on an exchange rate of fiat-backed digital assets to fiat. In embodiments, the digital asset exchange computer system may utilize an exchange module (which may be operatively connected to the digital asset exchange computer system) to calculate the conversion between fiat and the fiat-backed digital asset. The exchange rate may be based on the value of the asset or assets that back the fiat-backed digital asset, which may be updated periodically, aperiodically, in real-time, in substantially real-time, and/or on predetermined intervals, to name a few. In embodiments an exchange module may display and/or otherwise communicate one or more exchange rates and/or the value of the fiat-backed digital asset in fiat. In embodiments, the exchange rate may be based on the type of fiat the user wishes to pay for fiat-backed digital assets and/or the type of digital asset located in the account associated with the user. In embodiments the exchange rate may be a fixed exchange rate. For example, the exchange rate may be one fiat-backed digital asset equals one U.S. Dollar. As another example, the exchange rate may be 100 fiat-backed digital assets is equal to one U.S. Dollar. In embodiments, the exchange rate may be a fluctuating exchange rate. For example, the fluctuation exchange rate (e.g., variable exchange rate) may be based on market conditions.

As described above, the digital asset exchange computer system may process the deposit request (e.g., step S4906) by performing the steps illustrated in FIG. 49C and/or FIG. 49C-1. Referring to FIG. 49C-1, at step S4920', the digital asset exchange computer system may, in embodiments, calculate a second amount of second digital asset based on the first amount of stable value digital assets. The second amount of second digital asset may be determined using a fixed predetermined ratio of stable value digital asset tokens to second digital asset (e.g., 1 Stable Value Digital Asset Token=1 Second Digital Asset).

In embodiments, processing the deposit request may continue at step S4922. At step S4922, in embodiments, the digital asset exchange computer system may determine that the first amount of fiat-backed digital assets is present in the designated public address. In embodiments, the digital asset exchange computer system may determine whether the first amount of fiat-backed digital assets is less than or equal to the second amount of fiat-based digital assets available to the user. In embodiments, the digital asset exchanged computer system may compare the second amount fiat-backed digital assets to the first amount of fiat-backed digital assets to make the determination regarding whether the first user has sufficient funds to deposit the first amount of fiat-backed digital asset. The determination of whether the fiat-backed digital assets are present may be a call/return to and from the designated public address. In embodiments, the confirmation process may be a query to the peer-to-peer network for a status of the distributed transaction ledger, which may result in a receipt of the status of the distributed transaction ledger which may include the account balance associated with the first designated public address is greater than or equal to the first amount of fiat-backed digital assets.

If, in embodiments, the second amount of available fiat is less than the first amount of fiat-backed digital assets, the digital asset exchange computer system may determine that the first user has insufficient funds to complete the deposit. If the first user has insufficient funds, the process of FIGS. 49A-49C may stop here and/or, in embodiments, the digital asset exchange computer system may generate and send a notification to the first user device, indicating insufficient funds. In embodiments, a notification may be sent to a second user device associated with the first user, the notification indicating insufficient funds. In embodiments, such a notification may be made via a secure channel, such as an encrypted communication. For example, the notification may be encrypted using an asymmetric key, such as a PKI key, or using a symmetric key, such as used in TLS, to name a few. The notification, in embodiments, may be encrypted by the sender (e.g., the digital asset token issuer system) and/or the recipient (e.g., the first user device), to name a few.

As described above, the digital asset exchange computer system may process the deposit request (e.g., step S4906) by performing the steps illustrated in FIG. 49C and/or FIG. 49C-1. Referring to FIG. 49C-1, at step S4922', the digital asset exchange computer system may, in embodiments, determine that the first amount of stable value digital assets (and/or asset-backed digital assets) is present at the first designated public address. In embodiments, the digital asset exchange computer system may determine whether the first amount of stable value digital asset is less than or equal to the second amount of stable value digital assets available to the user. In embodiments, the digital asset exchanged computer system may compare the second amount stable value digital assets to the first amount of stable value digital assets to make the determination regarding whether the first user has sufficient funds to deposit the first amount of stable value digital asset. The determination of whether the stable value digital assets are present may be a call/return to and from the designated public address. In embodiments, the confirmation process may be a query to the peer-to-peer network for a status of the distributed transaction ledger, which may result in a receipt of the status of the distributed transaction ledger which may include the account balance associated with the first designated public address is greater than or equal to the first amount of stable value digital assets.

Referring to FIG. 49C, in embodiments, processing the second deposit request may continue at step S4924. At step S4924, the digital asset exchange computer system may determine a third amount of fiat associated with an updated amount of available fiat of the first user. The third amount of flat, in embodiments, may correspond to an amount of fiat the first user may own after the deposit request is executed and/or committed. To determine the third amount, the digital asset exchange computer system may subtract the second amount of fiat from the first amount of available fiat. For example, if the first amount of available fiat is 100 Dollars and the second amount of fiat is 75 Dollars, the third amount of fiat, in this example, would be 175 Dollars. In embodiments, the deposit request may have one or more fees associated with executing and/or committing the deposit request. These fees (e.g., transaction fees), may be represented as an amount of fiat-backed digital asset or an amount of fiat, or both. For example, if the first amount of available fiat is 100 Dollars, the second amount of fiat is 75 Dollars, and the transaction fee is 1 Dollar, the third amount of fiat, in this example, would be 174 Dollars.

Referring to FIG. 49C-1, in embodiments, at step S4924', where the first amount of stable value digital asset is present at the designated public address, the digital asset exchange computer system may determine a third amount of stable value digital asset associated with an updated amount of available stable value digital asset of the first user. In embodiments, the third amount of stable value digital asset equals the balance of stable value digital asset at the designated public address less the first amount of stable value digital asset. In embodiments, at step S4924', the digital asset exchange computer system (and/or first user device) may generate a transaction request including instructions to transfer all or a portion of the first amount of stable value digital asset into the designated public address (e.g., to cover the deposit request). The transaction request, in embodiments, may be digitally signed by the digital asset exchange computer system and/or by the digital asset exchange computer system and the first user device (e.g., via MPC). The transaction request, in embodiments, may be published to the blockchain by the digital asset exchange computer system (e.g., published to the designated public address on the blockchain). The published transaction request, continuing the example, may be verified by one or more nodes on the blockchain and/or executed by one or more nodes on the blockchain. In embodiments, a transaction fee may be required by one or more nodes, e.g., a miner, to verify and/or execute the generated and/or published transaction request.

Processing the second deposit request may continue at step S4926. At step S4926, the digital asset exchange computer system may update a fiat account ledger database. In embodiments, the update to the fiat account ledger database may be to account for the second amount of fiat associated with the second deposit request. The fiat account ledger, in embodiments, may be stored on computer readable member accessible by the digital asset exchange computer system. The fiat account ledger, in embodiments, may include one or more of the following: the amount of fiat each user owns in the custody of the digital asset exchange computer system; the total amount of fiat in the custody of the digital asset exchange computer system; the total amount of fiat that the digital asset exchange and/or digital asset exchange computer system owns; transactions associated with each user and/or fiat; and/or transactions associated with the digital asset exchange and/or digital asset exchange computer system and/or fiat, to name a few.

Processing the second deposit request may continue at step S4928. At step S4928, the digital asset exchange computer system may update a fiat-backed digital asset issuer fiat ledger. In embodiments, the update to the fiat-backed digital asset issuer fiat ledger may be to account for the second amount of fiat associated with the second withdraw request, updating the first user's available fiat to the third amount. In embodiments, the fiat-backed digital asset issuer fiat ledger may be associated with a flat-backed digital asset issuer (e.g., the issuer of the fiat-backed digital asset associated with the process described herein). In embodiments, the fiat-backed digital asset issuer flat ledger may be updated by the digital asset exchange computer system sending a request to the fiat-backed digital asset issuer. The request, in embodiments, may include a request to update the fiat-backed digital asset issuer fiat ledger. In response to receiving the request, the fiat-backed digital asset issuer may update their fiat-backed digital asset issuer fiat ledger. In embodiments, such a request may be made via a secure channel, such as an encrypted communication. For example, the request may be encrypted using an asymmetric key, such as a PKI key, or using a symmetric key, such as used in TLS, to name a few. The request, in embodiments, may be encrypted by the sender (e.g., the digital asset token issuer system) and/or the recipient (e.g., fiat-backed digital asset issuer), to name a few.

In embodiments, the digital asset exchange computer system may also receive the second amount of fiat (and/or second digital asset and/or asset, as applicable) to the fiat-backed digital asset issuer (and/or stable value digital asset issuer and/or asset-backed digital asset issuer, as applicable) (e.g., from an account on the peer-to-peer network associated with the digital asset exchange to an account on the peer-to-peer network associated with the fiat-backed digital asset issuer). In embodiments, the digital asset exchange computer system may receive the second amount of fiat (and/or second digital asset and/or asset) before, with, or after the request to update the fiat-backed digital asset issuer fiat ledger is sent to the fiat-backed digital asset issuer. In embodiments, the digital asset exchange computer system may periodically receive fiat at an account on the peer-to-peer network associated with the digital asset exchange from an account on the peer-to-peer network associated with the fiat-backed digital asset issuer. The periodic transfers may be made at defined time intervals. The defined time intervals may be defined based on: the amount of fiat that is due to be transferred from the digital asset exchange computer system to the fiat-backed digital asset issuer; the amount of transactions including fiat; the processing capabilities of the fiat-backed digital asset issuer and/or the digital asset exchange computer system; and/or one or more government regulations, to name a few. For example, the digital asset exchange computer system may receive fiat from the fiat-backed digital asset issuer once the digital asset exchange computer system has transferred $50,000 as a result of deposits of fiat-backed digital assets. In embodiments, the defined time intervals may be predetermined times throughout each day, week, month, and/or year, to name a few. For example, the digital asset exchange computer system may periodically receive fiat from an account on the peer-to-peer network associated with the fiat-backed digital asset issuer every day at 5:00 PM EST.

As described above, the digital asset exchange computer system may process the deposit request (e.g., step S4906) by performing the steps illustrated in FIG. 49C and/or FIG. 49C-1. Referring to FIG. 49C-1, at step S4926', the digital asset exchange computer system may, in embodiments, update a digital asset account ledger database. In embodiments, the update to the digital asset account ledger database may be to account for the second amount of second digital asset associated with the second deposit request. The digital asset account ledger, in embodiments, may be stored on computer readable member accessible by the digital asset exchange computer system. The digital asset account ledger, in embodiments, may include one or more of the following: the amount of second digital asset each user owns in the custody of the digital asset exchange computer system; the total amount of second digital asset in the custody of the digital asset exchange computer system; the total amount of second digital asset that the digital asset exchange and/or digital asset exchange computer system owns; transactions associated with each user and/or second digital asset; and/or transactions associated with the digital asset exchange and/or digital asset exchange computer system and/or second digital asset, to name a few.

Processing the second deposit request, in embodiments, may continue at step S4928'. At step S4928', the digital asset exchange computer system may update a stable value digital asset issuer second digital asset ledger. In embodiments, the update to the stable value digital asset issuer second digital asset ledger may be to account for the second amount of second digital asset associated with the second withdraw request, updating the first user's available second digital asset balance to the third amount. In embodiments, the stable value digital asset issuer second digital asset ledger may be associated with a stable value digital asset issuer (e.g., the issuer of the stable value digital asset associated with the process described herein). In embodiments, the stable value digital asset issuer second digital asset ledger may be updated by the digital asset exchange computer system sending a request to the stable value digital asset issuer. The request, in embodiments, may include a request to update the stable value digital asset issuer second digital asset ledger. In response to receiving the request, the stable value digital asset issuer may update their stable value digital asset issuer second digital asset ledger. In embodiments, such a request may be made via a secure channel, such as an encrypted communication. For example, the request may be encrypted using an asymmetric key, such as a PKI key, or using a symmetric key, such as used in TLS, to name a few. The request, in embodiments, may be encrypted by the sender (e.g., the digital asset token issuer system) and/or the recipient (e.g., the stable value digital asset issuer), to name a few.

Referring back to FIG. 49C, in embodiments, processing the second deposit request may continue at step S4930 (and/or step S4930' of FIG. 49C-1). At step S4930 (and/or step S4930' of FIG. 49C-1), the digital asset exchange computer system may generate a first transaction request. The first transaction request, in embodiments, may include a first message that includes a request to obtain from the first designated public address, the first amount of fiat-backed digital assets (and/or the first amount of stable value digital assets and/or the first amount of asset-backed digital assets) and to provide the fiat-backed digital assets (and/or the first amount of stable value digital assets and/or the first amount of asset-backed digital assets) to the destination address. The first message may also include a request to burn the first amount of fiat-backed digital assets (and/or the first amount of stable value digital assets and/or the first amount of asset-backed digital assets). Alternatively, in embodiments, the first message may also include a request to store the first amount of fiat-backed digital assets (and/or the first amount of stable value digital assets and/or the first amount of asset-backed digital assets) at the destination address. In embodiments, the transaction request may be addressed to a public address associated with the fiat-backed digital asset issuer (and/or associated with the stable value digital asset issuer and/or associated with the asset-backed digital asset issuer) from a public address associated with the digital asset exchange computer system. In embodiments, the first message and/or the first transaction request may be encrypted and/or digitally signed by the digital asset exchange computer system (e.g., using a private key associated with the digital asset exchange computer system) and/or digitally signed by the digital asset exchange computer system and the first user device (e.g., via MPC).

In embodiments, the transaction request may include instructions to update the fiat account ledger database (and/or the digital asset account ledger database and/or the asset-backed digital asset account ledger database—both of which may be similar to the fiat account ledger database, the description applying herein) and to reserve enough fiat (and/or second digital asset and/or asset) to cover the second deposit request. In embodiments, the transaction request may include a digital signature associated with the digital asset exchange computer system. In embodiments, the transaction request may include a digital signature associated with a trusted entity system. The digital signature associated with the trusted entity system may be a combined digital signature based on of one or more private keys associated with one or more trusted entities of the trusted entity system. The digital signature, in embodiments, may further include one or more private keys associated with the first user.

In embodiments, processing the deposit request may continue, optionally, at step S4932. At step S4932, the digital asset exchange computer system may update the fiat-backed digital asset issuer fiat ledger to account for the generated transaction request. In embodiments, the update to the fiat-backed digital asset issuer fiat ledger may be to decrease a balance of fiat by the second amount of fiat (e.g., the amount of fiat the digital asset exchange computer system exchanged for the first amount of fiat-backed digital assets). In embodiments, the digital asset exchange computer system may update the ledger after the transaction request is published, executed, and/or confirmed to be executed (e.g., after steps S4934 and/or S4936).

Referring to FIG. 49C-1, in embodiments, at step S4932', the digital asset exchange computer system may update the stable value digital asset issuer second digital asset ledger In embodiments where the deposit request is for stable value digital assets (and/or asset-backed digital assets), at step S4932', the digital asset exchange computer system may update the stable value digital asset issuer second digital asset ledger (which may be similar to fiat-backed digital asset issuer fiat ledger, the description of which applying herein) to account for the generated transaction request. In embodiments, the update to the stable value digital asset issuer second digital asset ledger may be to decrease a balance of second digital asset (and/or asset) by the second amount of second digital asset (e.g., the amount of second digital asset the digital asset exchange computer system exchanged for the first amount of stable value digital assets). In embodiments, the digital asset exchange computer system may update the ledger after the transaction request is published, executed, and/or confirmed to be executed (e.g., after steps S4934' and/or S4936').

Referring back to FIG. 49C, in embodiments, processing the second deposit request may continue at step S4934 (and/or step S4934' of FIG. 49C-1). At step S4834 and/or step S4934', in embodiments, the digital asset exchange computer system transmits the transaction request to the peer-to-peer network via a network (e.g., network 15). In embodiments, the digital asset exchange computer system may publish the transaction request to the peer-to-peer network via a network (e.g., Network 15). The transaction request, in embodiments, may be published to the blockchain by the digital asset exchange computer system. The published transaction request may be verified by one or more nodes on the blockchain and/or executed by one or more nodes on the blockchain. In embodiments, a transaction fee may be required by one or more nodes, e.g., a miner, to verify and/or execute the generated and/or published transaction request. In embodiments, transmitting the first transaction request to the peer-to-peer network may cause the first transaction request to be published by a trusted entity system. In embodiments, the trusted entity system may publish the transaction request to the peer-to-peer network via a network (e.g., Network 15). In embodiments, publishing the transaction request may cause the peer-to-peer network to go through a process of executing and/or committing the transaction request (e.g., a consensus protocol) which may result in the transfer of the first amount of fiat-backed digital assets (and/or stable value digital assets and/or asset-backed digital assets) from the fiat-backed digital asset issuer to the first designated public address. In embodiments, publishing the transaction request may cause the peer-to-peer network to go through a process of executing and/or committing the transaction request (e.g., a consensus protocol) which may result in the deposit of the first amount of fiat-backed digital assets (and/or stable value digital assets and/or asset-backed digital assets) from the designated public address to the destination public address.

Processing the second deposit request may continue at step S4936. At step S4936, the first amount of fiat-backed digital assets is confirmed as not present at the designated public address of the first user. The confirmation, in embodiments, may be based on reference to the distributed transaction ledger. In embodiments, the first user public address in embodiments, may be the first designated public address. In embodiments, the digital asset exchange computer system may confirm that the first amount of fiat-backed digital assets is not present at the designated public address (or the first destination public address received the first amount of fiat-backed digital assets). The confirmation process may be a call/return to and from the designated public address and/or the first user public address. In embodiments, the confirmation process may be a query to the peer-to-peer network for a status of the distributed transaction ledger, which may result in a receipt of the status of the distributed transaction ledger which may include the deposit of the first amount of fiat-backed digital assets.

In embodiments where the second deposit request is for a first amount of stable value digital assets, in embodiments, the process may continue with step S4936'. At step S4936', in embodiments, the first amount of stable value digital assets is confirmed to not be present bat the designated public address (e.g., confirmed by the digital asset exchange computer system). In embodiments, the digital asset exchange computer system may confirm the balance of stable value digital asset at the designated public address based on reference to the blockchain. For example, the digital asset exchange computer system may generate and publish a call (which may be digitally signed in a similar manner as described above, the description of which applying herein) to the first designated public address (and/or another address which deposited the stable value digital asset). The first designated public address may, continuing the example, respond by publishing a return on the blockchain. The return, in embodiments, may confirm the execution of the first transaction request (e.g., by returning a balance indicating the first amount of stable value digital assets are not present at the designated public address).

In embodiments, the steps of the processes of FIGS. 49A-49C may be rearranged or omitted.

In embodiments, as illustrated in FIG. 15C, for example, the exemplary dashboard may also allow the user an opportunity to cancel a transaction before final execution by the blockchain network and inclusion on the underlying blockchain.

In Step S1002 of FIG. 10, for example, Alice's wallet, or associated digital asset address, may send a request message to the database maintained by the blockchain including: (a) Alice's digital signature, which is based on Alice's private key which corresponds to her public key which is associated with her ETHEREUM digital asset address (her public address), which is typically associated with a digital wallet (Source Address); (b) token identification information; (c) amount of token to be transferred; and (d) Bob's ETHEREUM digital asset address (Destination Address). In embodiments, if a fee is charged for the transaction, fee payment information may also be required and provided. For example, on the ETHEREUM network, an amount of GAS tokens may be required from the sender to pay for processing of the transaction into a block on the blockchain. In embodiments, the message may include a proposed fee amount and/or fee proposal including a limit in e.g., GAS. The request message will also be digitally signed by Alice's private key.

In Step S1004, when miners on the blockchain network receive the transaction request directed to the contract wallet or associated digital asset address, with the request message, miners on the blockchain network will confirm the transaction, including verifying that the message was properly signed by Alice's digital signature. In Step S1004-*b*, the miners may verify that Alice has sufficient amount of tokens to perform the requested transaction, for example, by comparing Alice's balance against Alice's token balance as indicated on the blockchain. In Step S1004-*c*, the validity of Bob's digital asset address (the Destination Address) may also be confirmed by the miners. The miners may also compare the request with smart contract coding and instructions included in the Contract Address. The transaction fee discussed above is paid to the miners for confirming the transaction as noted above.

In Step S1006, if the request is verified the transaction is published in the Security Token database of the blockchain reflecting a debit against Alice's token holdings and a corresponding credit to Bob's token holdings (less any applicable fees).

In Step S1008, response messages to the digital asset addresses of both Alice and Bob may be sent to reflect that the transaction was successfully processed. In embodiments, such messages may include information including: (i) the source digital asset address; (ii) the destination digital asset address; (iii) the amount of tokens transferred; and/or (iv) the new balances for each digital asset address or associated digital wallet. In embodiments, the message may include a proposed fee amount and/or fee proposal including a limit in e.g., GAS. In embodiments, Alice, Bob, and/or third parties may view the balances and transaction information based on the information stored in the blockchain, by, e.g., viewing token balances at websites like etherscan.io, to name a few.

In contrast to tokens, a blockchain based digital asset (such as ETHER) is hard coded into the blockchain (e.g., the ETHEREUM Blockchain) itself. It is sold and traded as a cryptocurrency, and it also powers the network (e.g., the ETHEREUM Network) by allowing users to pay for smart contract transaction fees. In some networks, transactions fees may be paid for in digital assets, such as tokens (e.g., GAS) or blockchain based digital assets (e.g., BITCOIN). In the ETHEREUM Network, all computations typically have a cost based on other digital assets, such as GAS.

In embodiments, when tokens are sent to or from a Contract Address, for example, a fee may be charged for that transaction (in this case, a request to the token's contract to update its database) in, e.g., some form of digital asset, such as ETHER, BITCOIN, and GAS, to name a few. In embodiments, the message may include a proposed fee amount and/or fee proposal including a limit in digital asset, e.g., ETHER, BITCOIN, or GAS. This payment is then collected by a miner who confirms the transaction in a block, which then gets added to the blockchain.

FIG. 2 is an exemplary screen shot of an excerpt of a BITCOIN transaction log or transaction ledger 115 showing digital asset account identifiers (e.g., addresses) corresponding to origin and destination accounts for each transaction and amount information for each transaction in accordance with exemplary embodiments of the present invention. The exemplary log 115 includes transaction identifiers, date and/or time information, fee information, digital asset account identifiers for the origin accounts, digital asset account identifiers for the destination accounts, and amounts transferred to and from each account. Such a ledger may also include description information (such as notes describing a transaction, e.g., "rent payment") and/or balance information, to name a few. Other forms of transaction logs can be used consistent with exemplary embodiments of the present invention. In an exemplary embodiment, the description information may be included as a message in a request for a transaction. The description information discussed above thus may also be used to confirm control of over a particular account.

As can be seen in FIG. 2, digital asset transfers may begin from a single origin and be sent to a single destination or multiple destinations. Similarly, digital assets may be transferred from multiple origins to one or more destinations.

Figure 2A:
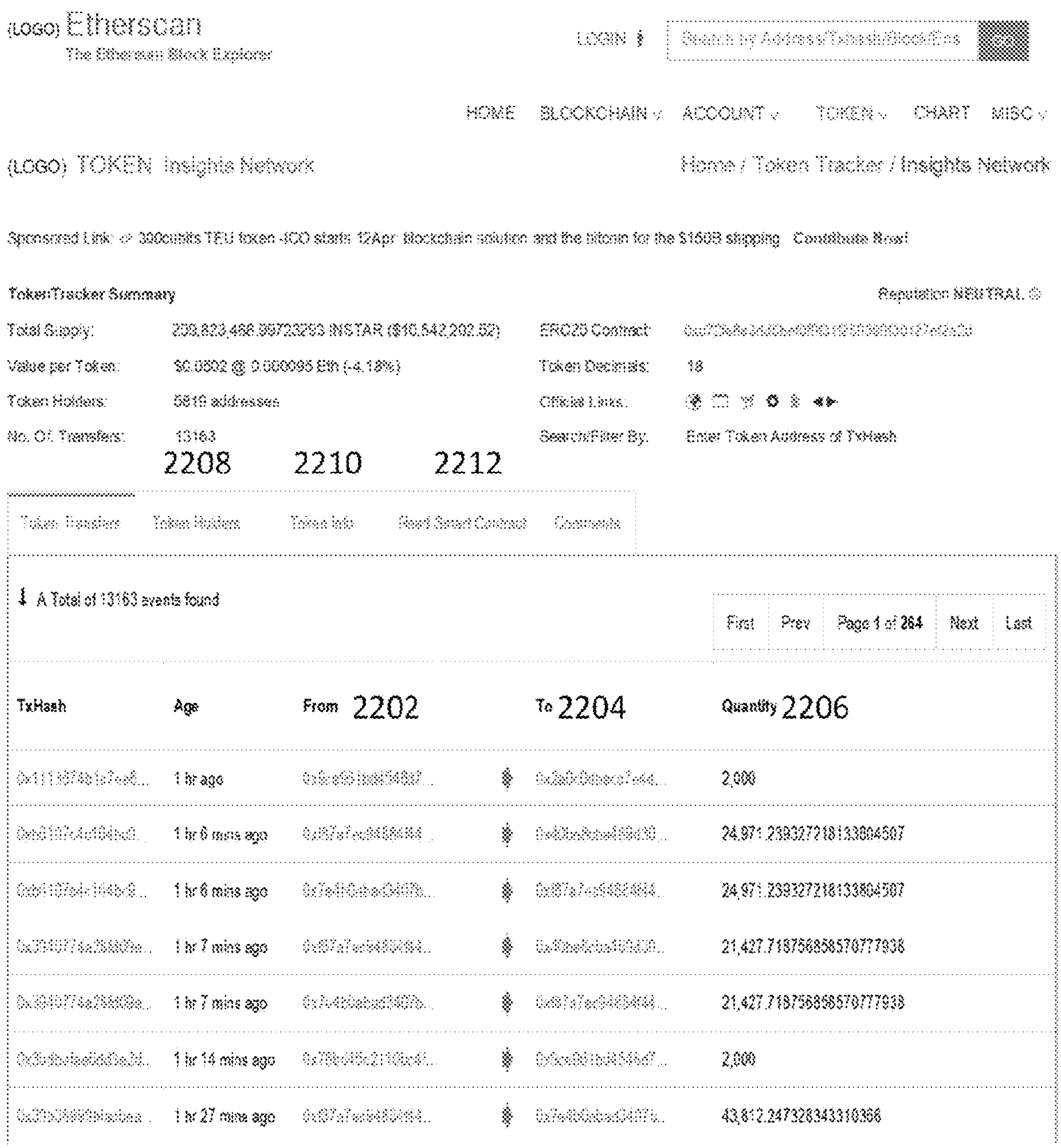
FIG. 2A is an exemplary screen shot of a Security Token ledger in accordance with exemplary embodiments of the present invention.

FIG. 2A illustrates a screenshot showing an exemplary embodiment of a token ledger for a GAS token. This particular screenshot shows a specific example the token ledger for the GAS token provided by etherscan.io. As illustrated the ledger illustrates, in chronological order, a series of transactions identifying the source address 2202 and destination address 2204 along with the quantity of tokens 2206 transferred in each transaction. In embodiments, the Security Token ledger of the present application may be similar to that illustrated in FIG. 2A. In embodiments, as illustrated in FIG. 2A, the Security Token ledger may also include the option to identify all Token holders 2208 as well as options to view token details 2210 and to view the contract details 2012. Similarly, in embodiments, an SVCoin Token ledger of the present application may be similar to that illustrated in FIG. 2A. Digital asset ledgers may be maintained in the form of a database. Such a database may be maintained on a blockchain or off a blockchain as a sidechain which may later be published to the blockchain.

An exemplary embodiment of a digital asset network is illustrated in FIG. 1. In embodiments, other digital math-based assets can be maintained and/or administered by other digital math-based asset networks. Without meaning to limit the invention, a digital math-based asset network will be discussed with reference to a BITCOIN network by example. Of course, other digital asset networks, such as the ETHEREUM network can be used with embodiments of the present invention. A digital math-based asset network, such as a BITCOIN network, may be an on-line, end-user to end-user network hosting a public transaction ledger 115 and governed by source code 120' comprising cryptologic and/or algorithmic protocols. A digital asset network can comprise a plurality of end users, a . . . N, each of which may access the network using one or more corresponding user device 105*a*, 105*b*, . . . 105N. In embodiments, user devices 105*a*, 105*b*, . . . 105N may be operatively connected to each other through a data network 125, such as the Internet, a wide area network, a local area network, a telephone network, dedicated access lines, a proprietary network, a satellite network, a wireless network, a mesh network, or through some other form of end-user to end-user interconnection, which may transmit data and/or other information. Any participants in a digital asset network may be connected directly or indirectly, as through the data network 125, through wired, wireless, or other connections.

In the exemplary embodiment, user devices 105*a*, 105*b*, . . . 105N can each run a digital asset client 110, e.g., a BITCOIN client, which can comprise digital asset source code 120 and an electronic transaction ledger 115. The source code 120 can be stored in processor readable memory, which may be accessed by and/or run on one or more processors. The electronic transaction ledger 115 can be stored on the same and/or different processor readable memory, which may be accessible by the one or more processors when running the source code 120. In embodiments, the electronic transaction leger 115*a* (contained on a user device 105*a*) should correspond with the electronic transaction ledgers 115*b* . . . 115N (contained on user devices 105*b* . . . 105N), to the extent that the corresponding user device has accessed the Internet and been updated (e.g., downloaded the latest transactions). Accordingly, the electronic transaction ledger may be a public ledger. Exemplary embodiments of digital asset clients 110 for the BITCOIN network (BITCOIN clients) include BITCOIN-Qt and BITCOIN Wallet, to name a few.

In embodiments, some of the transactions on the public ledger may be encrypted or otherwise shielded so that only authorized users may access ledger information about such transactions or wallets.

In addition, a digital asset network, such as a BITCOIN network, may include one or more digital asset exchange 130, such as BITCOIN exchanges (e.g., BITFINEX, BTC-E). Digital asset exchanges may enable or otherwise facilitate the transfer of digital assets, such as BITCOIN, and/or conversions involving digital assets, such as between different digital assets and/or between a digital asset and non-digital assets, currencies, to name a few. The digital asset network may also include one or more digital asset exchange agents 135, e.g., a BITCOIN exchange agent. Exchange agents 135 may facilitate and/or accelerate the services provided by the exchanges. Exchanges 130, transmitters 132, and/or exchange agents 135 may interface with financial institutions (e.g., banks) and/or digital asset users. Transmitters 132 can include, e.g., money service businesses, which could be licensed in appropriate geographic locations to handle financial transactions. In embodiments, transmitters 132 may be part of and/or associated with a digital asset exchange 130. Like the user devices 105, digital asset exchanges 130, transmitters 132, and exchange agents 135 may be connected to the data network 125 through wired, wireless, or other connections. They may be connected directly and/or indirectly to each other and/or to one or more user device 105 or other entity participating in the digital asset system.

Digital assets may be sub-divided into smaller units or bundled into blocks or baskets. For example, for BITCOIN, subunits, such as a SATOSHI, as discussed herein, or larger units, such as blocks of BITCOIN, may be used in exemplary embodiments. Each digital asset, e.g., BITCOIN, may be subdivided, such as down to eight decimal places, forming 100 million smaller units. For at least BITCOIN, such a smaller unit may be called a SATOSHI. Other forms of division can be made consistent with embodiments of the present invention.

In embodiments, the creation and transfer of digital math-based assets can be based on an open source mathematical and/or cryptographic protocol, which may not be managed by any central authority. Digital assets can be transferred between one or more users or between digital asset accounts and/or storage devices (e.g., digital wallets) associated with a single user, through a network, such as the Internet, via a computer, smartphone, or other electronic device without an intermediate financial institution. In embodiments, a single digital asset transaction can include amounts from multiple origin accounts transferred to multiple destination accounts. Accordingly, a transaction may comprise one or more input amounts from one or more origin digital asset accounts and one or more output amounts to one or more destination accounts. Origin and destination may be merely labels for identifying the role a digital asset account plays in a given transaction; origin and destination accounts may be the same type of digital asset account.

In embodiments, a digital math-based asset system may produce digital asset transaction change. Transaction change refers to leftover digital asset amounts from transactions in digital asset systems, such as BITCOIN, where the transactions are comprised of one or more digital inputs and outputs. A digital asset account can store and/or track unspent transaction outputs, which it can use as digital inputs for future transactions. In embodiments, a wallet, third-party system, and/or digital asset network may store an electronic log of digital outputs to track the outputs associated with the assets contained in each account. In digital asset systems such as BITCOIN, digital inputs and outputs cannot be subdivided. For example, if a first digital asset account is initially empty and receives a transaction output of 20 BTC (a BITCOIN unit) from a second digital asset account, the first account then stores that 20 BTC output for future use as a transaction input. To send 15 BTC, the first account must use the entire 20 BTC as an input, 15 BTC of which will be a spent output that is sent to the desired destination and 5 BTC of which will be an unspent output, which is transaction change that returns to the first account. An account with digital assets stored as multiple digital outputs can select any combination of those outputs for use as digital inputs in a spending transaction. In embodiments, a digital wallet may programmatically select outputs to use as inputs for a given transaction to minimize transaction change, such as by combining outputs that produce an amount closest to the required transaction amount and at least equal to the transaction amount.

Referring again to FIG. 1, a digital asset network may include digital asset miners 145. Digital asset miners 145 may perform operations associated with generating or minting new digital assets, and/or operations associated with confirming transactions, to name a few. Digital asset miners 145 may collaborate in one or more digital asset mining pools 150, which may aggregate power (e.g., computer processing power) so as to increase output, increase control, increase likelihood of minting new digital assets, increase likelihood of adding blocks to a blockchain, to name a few.

In embodiments, the processing of digital asset transactions, e.g., BITCOIN transactions, can be performed by one or more computers over a distributed network, such as digital asset miners 145, e.g., BITCOIN miners, and/or digital asset mining pools 150, e.g., BITCOIN mining pools. In embodiments, mining pools 150 may comprise one or more miners 145, which miners 145 may work together toward a common goal. Miners 145 may have source code 120', which may govern the activities of the miners 145. In embodiments, source code 120' may be the same source code as found on user devices 105. These computers and/or servers can communicate over a network, such as an internet-based network, and can confirm transactions by adding them to a ledger 115, which can be updated and archived periodically using peer-to-peer file sharing technology. For example, a new ledger block could be distributed on a periodic basis, such as approximately every 10 minutes. In embodiments, the ledger may be a blockchain. Each successive block may record transactions that have occurred on the digital asset network. In embodiments, all digital asset transactions may be recorded as individual blocks in the blockchain. Each block may contain the details of some or all of the most recent transactions that are not memorialized in prior blocks. Blocks may also contain a record of the award of digital assets, e.g., BITCOIN, to the miner 145 or mining pool 150 who added the new block, e.g., by solving calculations first.

A miner 145 may have a calculator 155, which may solve equations and/or add blocks to the blockchain. The calculator 155 may be one or more computing devices, software, or special-purpose device, to name a few. In embodiments, in order to add blocks to the blockchain, a miner 145 may be required to map an input data set (e.g., the blockchain, plus a block of the most recent transactions on the digital asset network, e.g., transactions on the BITCOIN network, and an arbitrary number, such as a nonce) to a desired output data set of predetermined length, such as a hash value. In embodiments, mapping may be required to use one or more particular cryptographic algorithms, such as the SHA-256 cryptographic hash algorithm or scrypt, to name a few. In embodiments, to solve or calculate a block, a miner 145 may be required to repeat this computation with a different nonce until the miner 145 generates a SHA-256 hash of a block's header that has a value less than or equal to a current target set by the digital asset network. In embodiments, each unique block may only be solved and added to the blockchain by one miner 145. In such an embodiment, all individual miners 145 and mining pools 150 on the digital asset network may be engaged in a competitive process and may seek to increase their computing power to improve their likelihood of solving for new blocks. In embodiments, successful digital asset miners 145 or mining pools 150 may receive an incentive, such as, e.g., a fixed number of digital assets (e.g., BITCOIN) and/or a transaction fee for performing the calculation first and correctly and/or in a verifiable manner.

In embodiments, the cryptographic hash function that a miner 145 uses may be one-way only and thus may be, in effect, irreversible. In embodiments, hash values may be easy to generate from input data, such as valid recent network transaction(s), blockchain, and/or nonce, but neither a miner 145 nor other participant may be able to determine the original input data solely from the hash value. Other digital asset networks may use different proof of work algorithms, such as a sequential hard memory function, like scrypt, which may be used for LITECOIN. As a result, generating a new valid block with a header less than the target prescribed by the digital asset network may be initially difficult for a miner 145, yet other miners 145 can easily confirm a proposed block by running the hash function at least once with a proposed nonce and other identified input data. In embodiments, a miner's proposed block may be added to the blockchain once a defined percentage or number of nodes (e.g., a majority of the nodes) on the digital asset network confirms the miner's work. A miner 145 may have a verifier 160, which may confirm other miners' work. A verifier 160 may be one or more computers, software, or specialized device, to name a few. A miner 145 that solved such a block may receive the reward of a fixed number of digital assets and/or any transaction fees paid by transferors whose transactions are recorded in the block. "Hashing" may be viewed as a mathematical lottery where miners that have devices with greater processing power (and thus the ability to make more hash calculations per second) are more likely to be successful miners 145. In embodiments, as more miners 145 join a digital asset network and as processing power increases, the digital asset network may adjust the complexity of the block-solving equation to ensure that one newly-created block is added to the blockchain approximately every ten minutes. Digital asset networks may use different processing times, e.g., approximately 2.5 minutes for LITECOIN, approximately 10 minutes for BITCOIN, to name a few.

In addition to archiving transactions, a new addition to a ledger can create or reflect creation of one or more newly minted digital assets, such as BITCOIN. In embodiments, new digital math-based assets may be created through a mining process, as described herein. In embodiments, the number of new digital assets created can be limited. For example, in embodiments, the number of digital assets (e.g., BITCOIN) minted each year is halved every four years until a specified year, e.g., 2140, when this number will round down to zero. At that time no more digital assets will be added into circulation. In the exemplary embodiment of BITCOIN, the total number of digital assets will have reached a maximum of 21 million assets in denomination of BITCOIN. Other algorithms for limiting the total number of units of a digital math-based asset can be used consistent with exemplary embodiments of the present invention. For example, the LITECOIN network is anticipated to produce 84 million LITECOIN. In embodiments, the number of digital assets may not be capped and thus may be unlimited. In embodiments, a specified number of coins may be added into circulation each year, e.g., so as to create a 1% inflation rate.

In embodiments, the mining of digital assets may entail solving one or more mathematical calculations. In embodiments, the complexity of the mathematical calculations may increase over time and/or may increase as computer processing power increases. In embodiments, result of solving the calculations may be the addition of a block to a blockchain, which may be a transaction ledger, as described further below. Solving the calculations may verify a set of transactions that has taken place. Solving the calculations may entail a reward, e.g., a number of digital math-based assets and/or transaction fees from one or more of the verified transactions.

Different approaches are possible for confirming transactions and/or creating new assets. In embodiments, a digital asset network may employ a proof of work system. A proof of work system may require some type of work, such as the solving of calculations, from one or more participants (e.g., miners 145) on the network to verify transactions and/or create new assets. In embodiments, a miner 145 can verify as many transactions as computationally possible. A proof of work system may be computationally and/or energy intensive. In embodiments, the network may limit the transactions that a miner 145 may verify.

In embodiments, a digital asset network may employ a proof of stake system. In a proof of stake system, asset ownership may be tied to transaction verification and/or asset creation. Asset ownership can include an amount of assets owned and/or a duration of ownership. The duration of ownership may be measured linearly as time passes while a user owns an asset. In an exemplary embodiment, a user holding 4% of all digital assets in a proof of stake system can generate 4% of all blocks for the transaction ledger. A proof of stake system may not require the solution of complex calculations. A proof of stake system may be less energy intensive than a proof of work system. In a proof of stake system, in embodiments, validators are responsible for ordering transactions and creating new blocks so that each node can agree on the state of the network. Unlike the competitive mining taking place in a proof of work system, validators in a proof of stake system, in embodiments, are randomly selected to create blocks. In embodiments, validators are responsible for checking and validating proposed blocks by other validators when they are not creating blocks. A user's stake is used as a way to incentivize a validator to behave properly. For example, a user that fails to validate a block, or deliberately colludes may lose a portion or the entirety of their stake. In embodiments, validators may receive rewards for proposing new blocks and/or validating blocks proposed by other validators. In embodiments, validators do not need use significant amounts of energy because they do not compete with other validators, thereby reducing the energy required by the proof of stake system.

In embodiments, a hybrid of proof of work and proof of stake systems may be employed. For example, a proof of work system may be employed initially, but as the system becomes too energy intensive, it may transition to a proof of stake system.

Proof of work and proof of stake are both examples of consensus algorithms. Such consensus algorithms have as their goal providing a method of reaching consensus to improve the system whether it be on ways of improving transactions, upgrading the network, etc.

In embodiments, asset creation and/or transaction confirmation can be governed by a proof of stake velocity system. Proof of stake velocity may rely upon asset ownership where the function for measuring duration of ownership is not linear. For example, an exponential decay time function may ensure that assets more newly held correspond to greater power in the system. Such a system can incentivize active participation in the digital math-based asset system, as opposed to storing assets passively.

In embodiments, a proof of burn system may be employed. Proof of burn may require destroying assets or rendering assets un-spendable, such as by sending them to an address from which they cannot be spent. Destroying or rendering assets unusable can be an expensive task within the digital math-based asset system, yet it may not have external costs such as the energy costs that can be associated with mining in a proof of work system.

Blockchains can include a consensus generating protocol through which the network determines whether a transaction is valid, included in the ledger and in what order each transaction should be included. Examples of such facilities can include mining, proof of work, proof of stake protocols, to name a few.

In embodiments, the fiat-backed digital asset may be tied to a distributed transaction ledger which may be maintained on a peer-to-peer network that includes a plurality of geographically distributed computer systems. In embodiments, the distributed transaction ledger may be public, private, semi-private, and/or semi-public, to name a few. For example, the distributed transaction ledger may be published publicly available to anyone who wants to see it. As another example, the distributed transaction ledger may not be published and, to be able to access the distributed transaction ledger, a user may send a query the peer-to-peer network.

The peer-to-peer network, in embodiments, may be: the Ethereum Network, the Libra Network, the Neo Network, the Bitcoin Network, and/or the Stellar Network, to name a few. The peer-to-peer network, in embodiments, may be based on a mathematical protocol for proof of work. The peer-to-peer network, in embodiments, may be based on a mathematical protocol for proof of stake. The peer-to-peer network, in embodiments, may be based on a cryptographic mathematical protocol. In embodiments, the peer-to-peer network may be based on a mathematical protocol that is open sourced. In embodiments, the digital asset security token database, in embodiments, may be stored on computer readable media associated with a digital asset security token issuer system (e.g. memory of the digital asset security token issuer system). In embodiments, the digital asset security token database may be maintained and stored on the plurality of geographically distributed computer systems in the peer-to-peer network.

Proof of work and proof of stake are both examples of consensus algorithms. Such consensus algorithms have as their goal providing a method of reaching consensus to improve the system whether it be on ways of improving transactions, upgrading the network, etc.

In embodiments, asset creation and/or transaction confirmation can be governed by a proof of stake velocity system. Proof of stake velocity may rely upon asset ownership where the function for measuring duration of ownership is not linear. For example, an exponential decay time function may ensure that assets more newly held correspond to greater power in the system. Such a system can incentivize active participation in the digital math-based asset system, as opposed to storing assets passively.

In embodiments, a proof of burn system may be employed. Proof of burn may require destroying assets or rendering assets unspendable, such as by sending them to an address from which they cannot be spent. Destroying or rendering assets unusable can be an expensive task within the digital math-based asset system, yet it may not have external costs such as the energy costs that can be associated with mining in a proof of work system.

Blockchains can include a consensus generating protocol through which the network determines whether a transaction is valid, included in the ledger and in what order each transaction should be included. Examples of such facilities may include mining, proof of work, proof of stake protocols, to name a few.

Stable Value Digital Asset Token

In embodiments, a stable value digital asset token, or Stable Value Token ("SVCoin") may operate on a blockchain based network, such as the ETHEREUM network, a decentralized virtual currency and blockchain network with a programming language that can automatically facilitate, verify, and enforce the terms of a digital contract entered into by human or computer counterparties. In embodiments, the SVCoin may conform with the ERC-223 token standard, making it available for a variety of uses within the ETHEREUM Network. In embodiments, the SVCoin may conform to the ERC-721 token standard. However, unlike other types of cryptocurrencies currently available on the ETHEREUM Network or the virtual currency ecosystem generally, the SVCoin will be strictly pegged to a fiat currency, such as the U.S. Dollar, and a custodian, such as a trusted entity like a digital asset exchange or bank, to name a few, will hold an equal value in fiat (e.g., one (1) SVCoin is pegged to be equal to one (1) USD or one hundred (100) SVCoin is pegged to equal one (1) USD, to name a few). In embodiments, periodic or aperiodic reconciliations may be performed to confirm that the amount of fiat currency held by the trusted entity corresponds to the number of SVCoins (Stable Value Tokens) held on the public ledger. In embodiments, the reconciliation may account for the fact that SVCoins (Stable Value Tokens) may have been created but not yet distributed to third parties.

In embodiments, a digital asset exchange, such as a regulated digital asset exchange, like Gemini, may be the sole issuer of the SVCoin. In embodiments, especially in the context of a regulated digital asset exchange, in order to obtain freshly minted SVCoin, customers must first register with the digital asset exchange and create an exchange account to allow access to the digital asset exchange platform. Customers may deposit fiat (e.g., USD) with the digital asset exchange, via, e.g., Fedwire, ACH, SWIFT, to name a few, into the customers respective exchange account, or convert into fiat some or all of existing digital assets held at the digital asset exchange. SVCoin may be held in the customer's exchange account or may be transferred via the blockchain, such as via the ETHEREUM Network. In embodiments, the SVCoin issuer may be a digital asset exchange, a bank, a trust, or some other trusted entity, to name a few.

In embodiments, regardless of whether the SVCoin is stored in the customer's exchange account or transferred via the blockchain such as the ETHEREUM Network, the digital exchange will continue to hold sufficient fiat to maintain the total value of SVCoin based on a notional pegged rate (e.g., one USD for every one SVCoin issued). In embodiments, the value of the SVCoin is pegged to the fiat in a fixed proportion, for example 1:1. In embodiments, fiat will be held in a segregated, omnibus bank account at one or more federally insured depository institution. In embodiments, the fiat may be held in other secure and non-volatile financial instruments, such as invested in treasury bills or other liquid, interest bearing financial instruments.

In embodiments, a fiat-backed digital asset may be used in which may be a digital asset that is backed by one or more types of assets such as fiats (e.g., U.S. Dollars, Euro, Yen, British Pound, Swiss Franc, Canadian Dollar, Australian Dollar, New Zealand Dollar, Kuwaiti Dinar, Bahrain Dinar, Oman Rial, Jordan Dinar, Cayman Island Dollar, South African Rand, Mexican Pesos, Renminbi, to name a few); bank accounts in such fiat; government securities denominated in such fiats (e.g., U.S. treasury certificates); municipal bonds or other government issued bonds, shares in exchange trade funds holding currencies or currency future contracts, certificate of deposits ("CD"); to name a few. In embodiments, other forms of backed digital assets may also be used, where the assets may also include other digital assets, other physical assets (like real estate and/or inventors), securities, equities, bonds, commodities (e.g., gold, silver, diamonds, crops, oil, to name a few), or financial instruments (e.g., futures, puts, calls, credit default swaps, to name a few). In embodiments, the assets may be only one kind of asset (e.g., dollars held in a bank or government security or CD, to name a few) or a basket of assets (e.g., multiple fiats, e.g., dollars, euros, yet, to name a few).

In embodiments, customers wishing to redeem their SVCoin for fiat may do so through the digital asset platform or a trusted entity. Customers of a digital asset platform (such as a digital asset exchange like Gemini) that have transferred their SVCoin to the blockchain will be able to transfer their SVCoin back to their exchange account, and subsequently redeem them for fiat through the digital exchange platform, such as via Fedwire, ACH or SWIFT to the customer's registered bank account, to name a few. For each fiat redeemed with the digital exchange, a corresponding SVCoin will be removed from circulation. As mentioned above, exemplary embodiments of such transactions are discussed below in connection with the description of FIGS. 11A-1-4, 11B-1-4, and 11C-1-2.

In embodiments, the Stable Value Token may be implemented as a token on the ETHEREUM blockchain, following the open standard known as ERC20 adopted by the ETHEREUM community. In embodiments, the Stable Value Token may be a system of smart contracts. In embodiments, the Stable Value Token may be a triplet of smart contracts on the ETHEREUM blockchain, which may be referred to as 'Proxy', 'Impl', and 'Store'.

In embodiments, the smart contract known as 'Proxy' is the permanent and public face of the Stable Value Token and provides the interface to interact with the token to allow token holders transfer their tokens and view token balances. In embodiments, however, this contract contains neither the code nor the data that comprises the behavior and state of the Stable Value Token.

In embodiments, the 'Proxy' contract delegates to the contract known as 'Impl' authority to execute the logic that governs token transfers, issuance, and other core features. In embodiments, 'Impl' does not directly own the data that is the ledger of the Stable Value Token, the mapping of token holders to their balances, but instead delegates this to the smart contract known as 'Store'.

In embodiments, the arrangement of 'Proxy', 'Impl', and 'Store' provides for future change and flexibility. While 'Proxy' may be the permanent address of the Stable Value Token on the ETHEREUM blockchain, and 'Store' is the external storage of the token ledger, the 'Impl' contract is designed to be replaced, if need be. Utilizing this architecture to implement the Stable Value Token provides for the following advantages:

1. allows for responding to security incidents and resolving vulnerabilities;
2. allows for extending the system with new features;
3. allows for adding later optimizations to improve the operational efficiency of the token; and
4. In extreme cases and when compelled to do so, allows for pause, block, or reverse token transfers.

In embodiments, each of these three contracts may be a custodian: an actor in the system that has the sole authority to authorize important actions. In embodiments, the custodianship role varies for each of 'Proxy', 'Impl', and 'Store'. In embodiments, the custodian of 'Proxy' can redirect the delegation to the active token implementation, the specific 'Impl' contract. In embodiments, matching this arrangement, the 'Store' contract may only accept updates to its ledger from a single trusted source, the active token implementation, the specific 'Impl' contract. In embodiments, these two custodial actions on 'Proxy' and 'Store' provide the upgrade feature where a new 'Impl' displaces the prior version by the custodian of 'Proxy' redirecting the delegation in 'Proxy'; and a new 'Impl' displaces the prior version by the custodian of 'Store' updating the trusted caller of 'Store'. In embodiments, the custodians of 'Proxy' and 'Store' can also pass custodianship to new custodians.

In embodiments, the primary custodial action on the 'Impl' contract is different. In embodiments, an important aspect of the Stable Value Tokens is governing the increase to the token supply since at all times the system must ensure that there are at least as many U.S. Dollars as there are Stable Value Tokens in circulation. In embodiments, the 'Impl' contract contains the logic to increase the token supply, and the custodian of 'Impl' has the sole authority to invoke it. In embodiments, custodianship can also be passed.

In embodiments, an auxiliary contract is a contract to fulfill the custodian role, which we will refer to here as 'Custodian'. In embodiments, this contract is designed around several security principles:

1. Dual Control: actions by the 'Custodian' contract are initially locked, and pending actions will only proceed once two out of a set of designated signers approve the action. (Approval is a digital signature linked to the action instructions, e.g., the amount and destination of new tokens.)
2. Offline Control: the 'Custodian' contract is designed with the expectation that the set of designated signers are keys managed by offline ("air gapped") computer systems.
3. Time Locks: actions by the 'Custodian' contract are locked not only pending approval from two signers, but also require the passage of a minimum period of time before they can be executed. This enables the effective use of intrusion detection systems and a window of opportunity to respond to security breaches.

4. Revocation: pending actions can be revoked; thus erroneous or malicious actions can be nullified while they are still pending.

This provides strong security control on custodianship, which is appropriate for the critical and infrequent system actions of replacing the 'Impl' contract ("the upgrade feature") and passing custodianship. In embodiments, however, for the action of increasing the token supply, an action expected to occur frequently, using 'Custodian' as the custodian of 'Impl' introduces an undue operational burden.

In embodiments, a second auxiliary contract, is referred to as 'PrintLimiter'. In embodiments, the purpose of the 'PrintLimiter' smart contract is to govern the increases to the supply of Stable Value Tokens, specifically by a hybrid of online and offline control. While 'Custodian' is the custodian of the contracts 'Proxy' and 'Store', the 'PrintLimiter' contract is the custodian of 'Impl', and in turn, 'Custodian' is the custodian of 'PrintLimiter'. In embodiments, this doubly-layered custodianship relationship still reserves ultimate control to 'Custodian', however, the 'PrintLimiter' contract grants limited permission to increase the token supply ("print" new tokens) to a key in online control (an automated, networked computer system), which we will refer to as 'printer'. In embodiments, the 'printer' key can increase the token supply in response to user demand to withdraw U.S. dollars as Stable Value Tokens, but only up until a ceiling. In embodiments, further expansion of the supply is disallowed by 'PrintLimiter' once the ceiling is reached. In embodiments, increasing the ceiling is an action reserved for the custodian, and the custodian of 'PrintLimiter' is 'Custodian.' In embodiments, the 'printer' can reduce the ceiling thus reducing its own grant. In embodiments, offline control can increase the grant to online control; online control can decrease its own grant. In embodiments, the 'Print Limiter' smart contract may include instructions requiring authorization of multiple keys to increase the supply of Stable Value Tokens. In embodiments, the multiple keys may require at least two signers. This could include using a M of N model, where M is at least 2 and N is equal to or greater than M (e.g., 2 or more, when M is 2). Thus, in embodiments, multiple keys may include a set number of keys of a set number of possible keys, for example, two keys of a possible three keys. In embodiments, the multiple keys may require all keys of possible keys, for example, three keys of a possible three keys. In embodiments, the arrangement discussed herein achieves a hybrid of online and offline control over the supply of Stable Value Tokens. In embodiments, tokens can be issued in an efficient and timely manner, while the risk of inflation of the supply of Stable Value Tokens without backing U.S. Dollars is bounded.

In embodiments, as noted above, multiple signatures may be required for certain transactions such as those requiring intervention of the Custodian 1350. In embodiments, as noted above, changing the implementation pointer from ERC20Proxy 1310 which is currently set at S1312 (impl) to point to ERC20Impl 1320 (Version 1), requires resetting S1312B "impl" to point to ERC20Impl 1320A (version 2). In embodiments, a request is made to ERC20Proxy to change its instance of ERC20Impl. When the request is made, a unique lockId is generated. In embodiments, the Custodian contract 1350 for ERC20 Proxy 1310 calls requestUnlock and passes as arguments the lockId generated for the change request, and the function in ERC20Proxy 1310 the Custodian 1350 needs to call to confirm the change request. This generates a request, which is a unique identifier for this unlock request.

In embodiments, to complete the unlocking of Custodian and therefore propagate the change to ERC20Proxy 1310, the digital asset system operated by the token issuer uses its off-line key storage infrastructure to sign the request with the previously approved designated key sets. This may require the use of two or more key sets.

In embodiments, those signatures are passed into the Custodian's completeUnlock function along with the initial request. Once the request is validated against the signatures, completeUnlock parses the content of the request and issues the command. In this exemplary case, ERC20Proxy's confirmImplChange is called using the lockId generated in the initial ERC20Impl change request.

In embodiments, the arrangement discussed herein achieves a hybrid of online and offline control over the supply of Stable Value Tokens. In embodiments, tokens can be issued in an efficient and timely manner, while the risk of inflation of the supply of Stable Value Tokens without the backing of U.S. Dollars is bounded. In embodiments, pending actions may be revoked, allowing for the nullification of erroneous or malicious actions before being executed.

A method of withdrawing stable value digital asset tokens based on an underlying digital asset from a digital asset exchange computer system in exchange for fiat, in accordance with an embodiment of the present application includes: (a) authenticating, by the digital asset exchange computer system associated with a digital asset exchange, an access request by a first user device associated with a first user, to the digital asset exchange computer system comprising the steps of: (1) receiving, by the digital asset exchange computer system from the first user device, an authentication request including first user credential information associated with the first user; (2) determining, by the digital asset exchange computer system, that the first user device is authorized to access the digital asset exchange computer system based at least in part on the first user credential information; (3) generating, by the digital asset exchange computer system, first graphical user interface information for displaying a first graphical user interface on the first user device; (4) transmitting, from the digital asset exchange computer system to the first user device, the first graphical user interface information; (b) obtaining, by the digital asset computer system from the first user device, a withdraw request comprising the steps of: (1) receiving, by the digital asset exchange computer system from the first user device, a first electronic request to withdraw stable value digital asset tokens, wherein the stable value digital asset token is tied to an underlying digital asset which is maintained on a distributed public transaction ledger in the form of a blockchain that is maintained by a blockchain network including a plurality of geographically distributed computer systems in a peer-to-peer network; (2) in response to the first electronic request, obtaining, by the digital asset exchange computer system from a flat account ledger database stored on computer readable member accessible by the digital asset exchange computer system, first account balance information of the first user indicating a first amount of available fiat for the first user held by the digital asset exchange on behalf of the first user; (3) generating, by the digital asset exchange computer system, second graphical user interface information including at least the first account balance information; (4) transmitting, by the digital asset exchange computer system to the first user device, the second graphical user interface information; (5) receiving, by the digital asset exchange computer system from the first user device, a second electronic withdrawal request comprising at least: (A) a first amount of stable value digital asset tokens to be withdrawn; and (B) a destination public address on the underlying blockchain to transfer the first amount of stable value digital asset tokens; (c) processing, by the digital asset exchange computer system, the withdraw request by the steps of: (1) calculating, by the digital asset exchange computer system, a second amount of fiat based on the first amount of stable value digital asset tokens, where the second amount of fiat is determined using a fixed predetermined ratio of stable value digital asset tokens to fiat; (2) determining, by the digital asset exchange computer system, that the second amount of fiat is less than the first amount of available fiat of the first user; (3) in the case where the second amount of fiat is less than the first amount of available fiat of the first user, determining a third amount of fiat associated with an updated amount of available fiat of the first user, wherein the third amount of fiat equals the first amount of available fiat of the first user less the second amount of fiat; (4) updating, by the digital asset exchange computer system, the fiat account ledger database to reflect that the updated amount of available fiat of the first user is the third amount of fiat; (5) updating, by the digital asset exchange computer system, a stable value digital asset token issuer fiat ledger, to increase a balance of fiat by the second amount of fiat; (6) generating, by the digital asset exchange computer system, a first transaction request for the blockchain, from a first digital asset exchange public key address on the blockchain, which is mathematically related to a first digital asset exchange private key, which is stored in the computer readable member accessible by the digital asset exchange computer system, to a first contract address associated with a stable value token issuer, a first message including: i. a request to obtain in the first designated public address of the first user the first amount of stable value digital asset tokens; and wherein the first transaction request is signed with a digital signature generated using the digital asset exchange private key; (7) transmitting, by the digital asset exchange computer system to the blockchain network via the Internet, the first transaction request; (8) confirming, by the digital asset exchange computer system by reference to the blockchain, that the balance of stable value digital asset tokens in the first designated public address of the first user includes the first amount of stable value digital asset tokens.

In embodiments, the determining step (a)(c) further determines that the first user is a registered user of the digital asset exchange.

In embodiments, the digital asset exchange is licensed by a government regulatory authority.

In embodiments, the underlying digital asset is ETHER and the blockchain is the ETHEREUM Blockchain.

In embodiments, the underlying digital asset is NEO and the blockchain is the NEO Blockchain.

In embodiments, the underlying digital asset is STELLAR and the blockchain is the STELLAR Blockchain.

In embodiments, the fixed predetermined ratio is one stable value digital asset token is equal to one U.S. dollar.

In embodiments, the fixed predetermined ratio is one hundred stable value digital asset tokens is equal to one U.S. dollar.

In embodiments, the fixed predetermined ratio is one stable value digital asset token is equal to a basket for fiat currencies at a fixed or defined ratio. For example, one stable value digital asset token is equal to one U.S. dollar and one Euro. Other ratios may be employed consistent with embodiments of the present invention.

In embodiments, the updating step (c)(5) further comprises transferring the second amount of fiat from a digital asset exchange fiat account to a stable value digital asset token issuer fiat account.

In embodiments, the updating step (c)(5) further comprises periodically transferring fiat between the digital asset exchange fiat account and the stable value digital asset token issuer fiat account.

In embodiments, the instructions to obtain in the first designated public address of the first user the first amount of stable value digital asset tokens include instructions to generate the first amount of stable value digital asset tokens at the first designated public address of the first user.

In embodiments, the instructions to obtain in the first designated public address of the first user the first amount of stable value digital asset tokens include instructions to transfer the first amount of stable value digital asset tokens from a stable value digital asset token issuer public address to the first designated public address of the first user.

A method of depositing stable value digital asset tokens based on an underlying digital asset into a digital asset exchange computer system in exchange for fiat in accordance with another embodiment of the present application includes: (a) authenticating, by the digital asset exchange computer system associated with a digital asset exchange, an access request by a first user device associated with a first user, to the digital asset exchange computer system comprising the steps of: (1) receiving, by the digital asset exchange computer system from the first user device, an authentication request including first user credential information associated with the first user; (2) determining, by the digital asset exchange computer system, that the first user device is authorized to access the digital asset exchange computer system based at least in part on the first user credential information; (3) generating, by the digital asset exchange computer system, first graphical user interface information for displaying a first graphical user interface on the first user device; (4) transmitting, from the digital asset exchange computer system to the first user device, the first graphical user interface information; (b) obtaining, by the digital asset computer system from the first user device, a deposit request comprising the steps of: (1) receiving, by the digital asset exchange computer system from the first user device, a first electronic request to deposit stable value digital asset tokens, wherein the stable value digital asset token is tied to an underlying digital asset which is maintained on a distributed public transaction ledger in the form of a blockchain that is maintained by a blockchain network including a plurality of geographically distributed computer systems in a peer-to-peer network; (2) in response to the first electronic request, obtaining, by the digital asset exchange computer system from a fiat account ledger database stored on computer readable member accessible by the digital asset exchange computer system, first account balance information of the first user indicating a first amount of available fiat for the first user held by the digital asset exchange on behalf of the first user; (3) obtaining, by the digital asset exchange computer system, a user specific destination address, uniquely associated with the first user; (4) generating, by the digital asset exchange computer system, second graphical user interface information including at least the first account balance information and the user specific destination address; (5) transmitting, by the digital asset exchange computer system to the first user device, the second graphical user interface information; (6) receiving, by the digital asset exchange computer system from the first user device, a second electronic deposit request comprising at least: (A) a first amount of stable value digital asset tokens to be deposited; and (B) a designated public address of the first user on the underlying blockchain from which the first amount of stable value digital asset tokens will be transferred; (C) a digital signature based on a designated private key of the first user, wherein the designated private key is mathematically related to the designated public address; (c) processing, by the digital asset exchange computer system, the second electronic deposit request by the steps of: (1) calculating, by the digital asset exchange computer system, a second amount of fiat based on the first amount of stable value digital asset tokens, where the second amount of fiat is determined using a fixed predetermined ratio of stable value digital asset tokens to fiat; (2) determining, by the digital asset exchange computer system, that the first amount of stable value digital asset tokens is present at the designated public address of the first user; (3) in the case where the first amount of stable value digital asset tokens is present at the designated public address of the first user, determining a third amount of fiat associated with an updated amount of available fiat of the first user, wherein the third amount of fiat equals the first amount of available fiat of the first user plus the second amount of fiat; (4) updating, by the digital asset exchange computer system, the fiat account ledger database to reflect that the updated amount of available fiat of the first user is the third amount of fiat; (5) generating, by the digital asset exchange computer system, a first transaction request for the blockchain, from a first digital asset exchange public key address on the blockchain, which is mathematically related to a first digital asset exchange private key, which is stored in the computer readable member accessible by the digital asset exchange computer system, to a first contract address associated with a stable value token issuer, a first message including: i. a request to obtain, from the first designated public address of the first user, the first amount of stable value digital asset tokens from the designated public address of the first user and provide the first amount of stable value digital asset tokens to the user specific destination address; and ii. a request to destroy the first amount of stable value digital asset tokens; wherein the first transaction request is signed with a digital signature generated based on the digital asset exchange private key of the user digital asset exchange; (6) updating, by the digital asset exchange computer system, a stable value digital asset token issuer fiat ledger, to decrease a balance of fiat by the second amount of fiat; (7) transmitting, by the digital asset exchange computer system to the blockchain network via the Internet, the first transaction request; (8) confirming, by the digital asset exchange computer system by reference to the blockchain, that the first amount of stable value digital asset tokens are not present at the designated public address of the first user.

In embodiments, the determining step (a)(2) further determines that the first user is a registered user of the digital asset exchange.

In embodiments, the digital asset exchange is licensed by a government regulatory authority.

In embodiments, the underlying digital asset is ETHER and the blockchain is the ETHEREUM Blockchain.

In embodiments, the underlying digital asset is NEO and the blockchain is the NEO Blockchain.

In embodiments, the fixed predetermined ratio is one stable value digital asset token is equal to one U.S. dollar.

In embodiments, the fixed predetermined ratio is one hundred stable value digital asset tokens is equal to one U.S. dollar.

In embodiments, the updating step (c)(6) further comprises transferring the second amount of fiat from a digital asset exchange fiat account to a stable value digital asset token issuer fiat account.

In embodiments, the updating step (c)(6) further comprises periodically transferring fiat between the digital asset exchange fiat account and the stable value digital asset token issuer fiat account.

A method of depositing stable value digital asset tokens based on an underlying digital asset into a digital asset exchange computer system in exchange for fiat in accordance with an embodiment of the present application includes: (a) authenticating, by the digital asset exchange computer system associated with a digital asset exchange, an access request by a first user device associated with a first user, to the digital asset exchange computer system comprising the steps of: (1) receiving, by the digital asset exchange computer system from the first user device, an authentication request including first user credential information associated with the first user; (2) determining, by the digital asset exchange computer system, that the first user device is authorized to access the digital asset exchange computer system based at least in part on the first user credential information; (3) generating, by the digital asset exchange computer system, first graphical user interface information for displaying a first graphical user interface on the first user device; (4) transmitting, from the digital asset exchange computer system to the first user device, the first graphical user interface information; (b) obtaining, by the digital asset computer system from the first user device, a deposit request comprising the steps of: (1) receiving, by the digital asset exchange computer system from the first user device, a first electronic request to deposit stable value digital asset tokens, wherein the stable value digital asset token is tied to an underlying digital asset which is maintained on a distributed public transaction ledger in the form of a blockchain that is maintained by a blockchain network including a plurality of geographically distributed computer systems in a peer-to-peer network; (2) in response to the first electronic request, obtaining, by the digital asset exchange computer system from a fiat account ledger database stored on computer readable member accessible by the digital asset exchange computer system, first account balance information of the first user indicating a first amount of available fiat for the first user held by the digital asset exchange on behalf of the first user; (3) obtaining, by the digital asset exchange computer system, a user specific destination address, uniquely associated with the first user; (4) generating, by the digital asset exchange computer system, second graphical user interface information including at least the first account balance information and the user specific destination address; (5) transmitting, by the digital asset exchange computer system to the first user device, the second graphical user interface information; (6) receiving, by the digital asset exchange computer system from the first user device, a second electronic deposit request comprising at least: (A) a first amount of stable value digital asset tokens to be deposited; and (B) a designated public address of the first user on the underlying blockchain from which the first amount of stable value digital asset tokens will be transferred; (C) a digital signature based on a designated private key of the first user, wherein the designated private key is mathematically related to the designated public address; (c) processing, by the digital asset exchange computer system, the second electronic deposit request by the steps of: (1) calculating, by the digital asset exchange computer system, a second amount of fiat based on the first amount of stable value digital asset tokens, where the second amount of fiat is determined using a fixed predetermined ratio of stable value digital asset tokens to fiat; (2) determining, by the digital asset exchange computer system, that the first amount of stable value digital asset tokens is present at the designated public address of the first user; (3) in the case where the first amount of stable value digital asset tokens is present at the designated public address of the first user, determining a third amount of fiat associated with an updated amount of available flat of the first user, wherein the third amount of fiat equals the first amount of available fiat of the first user plus the second amount of fiat; (4) updating, by the digital asset exchange computer system, the fiat account ledger database to reflect that the updated amount of available fiat of the first user is the third amount of fiat; (5) generating, by the digital asset exchange computer system, a first transaction request for the blockchain, from a first digital asset exchange public key address on the blockchain, which is mathematically related to a first digital asset exchange private key, which is stored in the computer readable member accessible by the digital asset exchange computer system, to a first contract address associated with a stable value token issuer, a first message including: i. a request to obtain from the first designated public address of the first user the first amount of stable value digital asset tokens from the designated public address of the first user and provide them to the user specific destination address; ii. a request to store the first amount of stable value digital asset tokens at the user specific destination address; and wherein the first transaction request is signed with a digital signature generated based on the digital asset exchange private key of the user digital asset exchange; (6) transmitting, by the digital asset exchange computer system to the blockchain network via the Internet, the first transaction request; (7) confirming, by the digital asset exchange computer system by reference to the blockchain, that the first amount of stable value digital asset tokens are not present at the designated public address of the first user.

In embodiments, the determining step (a)(2) further determines that the first user is a registered user of the digital asset exchange.

In embodiments, the digital asset exchange is licensed by a government regulatory authority.

In embodiments, the underlying digital asset is ETHER and the blockchain is the ETHEREUM Blockchain.

In embodiments, the underlying digital asset is NEO and the blockchain is the NEO Blockchain.

In embodiments, the fixed predetermined ratio is one stable value digital asset token is equal to one U.S. dollar.

In embodiments, the fixed predetermined ratio is one hundred stable value digital asset tokens is equal to one U.S. dollar.

Increasing the Total Supply of Digital Asset Tokens

Figure 18A:
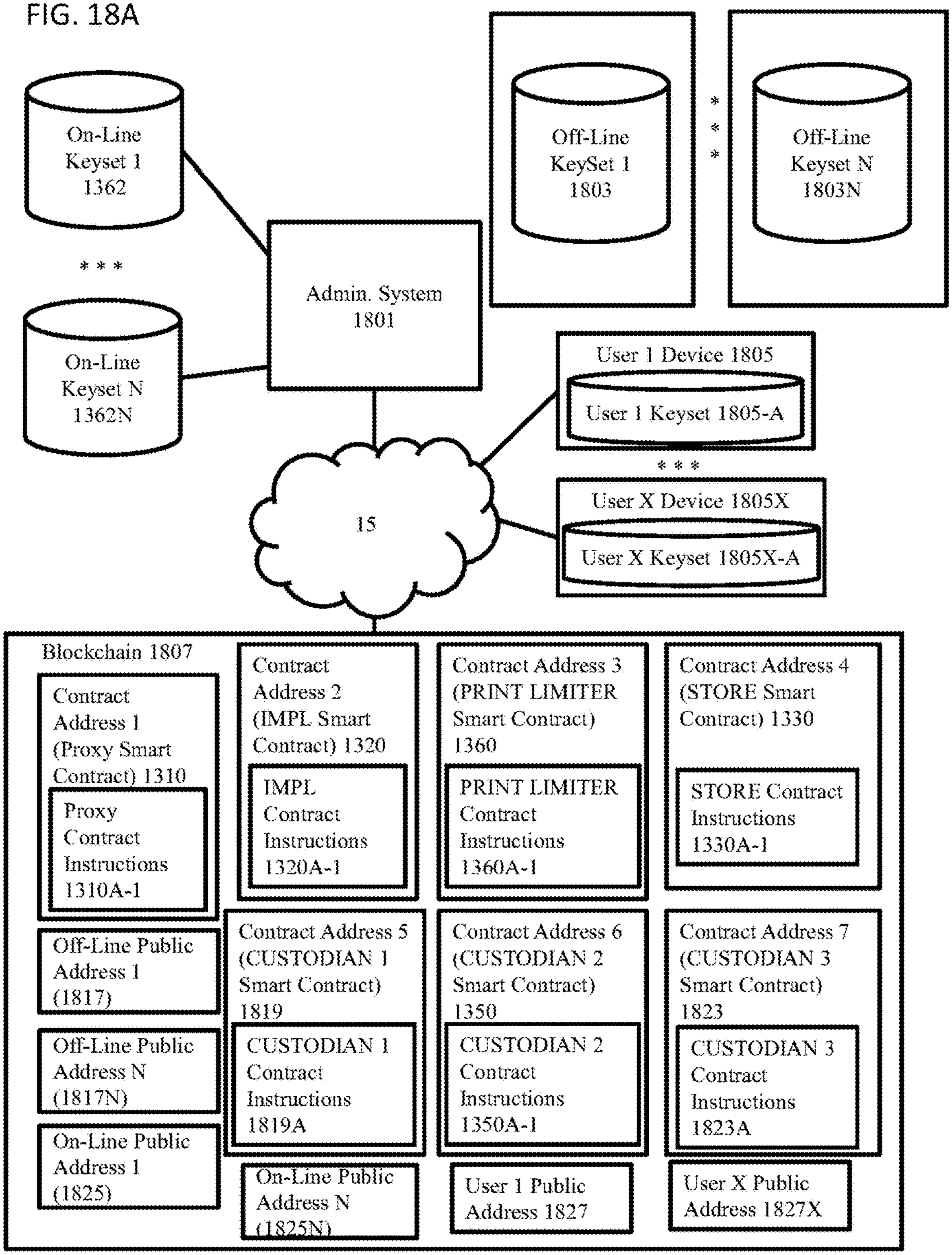
FIG. 18A is a schematic drawing of an exemplary collection of systems for increasing the total supply of digital asset tokens on an underlying blockchain in accordance with exemplary embodiments of the present invention.

FIG. 18A is a schematic drawing of an exemplary system for increasing the total supply of digital asset tokens on an underlying blockchain in accordance with exemplary embodiments of the present invention. The system shown in FIG. 18A may include an administrator system 1801 which may communicate with a plurality of end users, each of which may access the network 15 using one or more corresponding user device 1805, . . . 1805X, a blockchain 1807, and one or more on-line keysets 1362, . . . 1362N.

In embodiments, network 15, may be a wide area network, a local area network, a telephone network, dedicated access lines, a proprietary network, a satellite network, a wireless network, a mesh network, or through some other form of end-user to end-user interconnection, which may transmit data and/or other information. Any participants in a digital asset network may be connected directly or indirectly, as through the data network 15, through wired, wireless, or other connections. In embodiments, network 15 may be accessed using Transfer Control Protocol and Internet Protocol ("TCP/IP") (e.g., any of the protocols used in each of the TCP/IP layers), Hypertext Transfer Protocol ("HTTP"), WebRTC, SIP, and wireless application protocol ("WAP"), are some of the various types of protocols that may be used to facilitate communications between administrator system 1801 and user devices 1805, . . . 1805X. In some embodiments, the administrator system 1801 and/or user devices 1805, . . . 1805X may communicate with one another via a web browser using HTTP. Various additional communication protocols may be used to facilitate communications between administrator system 1801 and/or user devices 1805, . . . 1805X, including, but not limited to, Wi-Fi (e.g., 802.11 protocol), Bluetooth, radio frequency systems (e.g., 900 MHz, 1.4 GHz, and 5.6 GHz communication systems), cellular networks (e.g., GSM, AMPS, GPRS, CDMA, EV-DO, EDGE, 3GSM, DECT, IS 136/TDMA, iDen, LTE or any other suitable cellular network protocol), infrared, BitTorrent, FTP, RTP, RTSP, SSH, and/or VOIP.

As illustrated in FIG. 18A, the administrator system 1801 and/or user devices 1805, . . . 1805X may communicate with a blockchain network to access and/or add blocks to blockchain 1807. User devices 1805, . . . 1805X may for instance, may correspond to a suitable electronic device, such as, desktop computers, mobile computers (e.g., laptops, ultrabooks), mobile phones, smart phones, tablets, personal display devices, large scale display devices (e.g., billboards, street signs, etc.), personal digital assistants ("PDAs"), gaming consoles and/or devices, smart vehicles (e.g., cars, trucks, motorcycles, etc.), smart transportation devices (e.g., boats, ships, trains, airplanes, etc.), and/or wearable devices (e.g., watches, pins/broaches, headphones, etc.), to name a few.

The blockchain 1807 may include one more contract addresses, such as contract address for, e.g., a proxy smart contract 1310 (contract address 1), IMPL smart contract 1320 (contract address 2), PRINT LIMITER smart contract 1360 (contract address 3), STORE smart contract 1330 (contract address 4), CUSTODIAN 1 smart contract 1819 (contract address 5), CUSTODIAN 2 smart contract 1350 (contract address 6), CUSTODIAN 3 smart contract 1823 (contract address 7), as illustrated in FIG. 18A. Each contract address may include one or more contract addresses. Additionally, in embodiments, one or more contract addresses shown in connection with FIG. 18A may be associated with one or more contract addresses. For example, in embodiments, contract address 1 may be the same contract address as contract address 2. The blockchain 1807 may also include public addresses, such as off-line public address 1 1817, off-line public address N 1817N, on-line public address 1 1825, on-line public address N 1825N, user 1 public address 1827, and User X public address 1827X, as illustrated in FIG. 18A.

In embodiments, the blockchain 1807 may be a plurality of geographically distributed computer systems in a peer-to-peer network. Wireless communication may be provided using any of a variety of communication protocols and/or wireless communication networks, including e.g., GSM, GSM-R, UMTS, TD-LTE, LTE, LTE-Advanced Pro, LTE Advanced, Gigabit LTE, CDMA, iDEN, MVNO, MVNE, Satellite, TETRA, WiMAX, AMPS TDMA, Roaming SIM, DC-HSPA, HSPA, HSPA+, HSDPA, G, 2G, 3.5G, 4G, 4.5G, 5G, 5.5G, 6G, 6.5G, VoLTE, EDGE, GPRS, GNSS, EV-DO, 1×RTT, WCDMA, TDS-CDMA, CDMA2000, CSFB, FDMA, OFDMA, PDMA, AMPS, EV-DO, DECT, IS-95, NMT, UMTS, MPLS, MOCA, Broadband over Power Lines, NB-IoT, enhanced MTC (eMTC), LTE-WLAN, ISDN, Microwave, Long Range Wifi, Point to Point Wifi, EC-GSM-IoT, LTE-M, NB-IoT, Evolved Multicast Broadcast Multimedia Service (eMBMS) and LTE-Broadcast (LTE-B), to name a few.

The system described in connection with FIG. 18A may include one or more on-line keysets 1362, . . . 1362N. Each keyset includes a private key and a corresponding public key (or public address on the blockchain). For example, on-line keyset 1362 may be associated with on-line public address 1 1825. Similarly, by way of example, on-line keyset N 1362N may be associated with on-line public address N 1825N. In embodiments, each private key will typically be mathematically related to the corresponding public key, such as used with cryptocurrency Security Standard. In embodiments, the one or more on-line keysets 1362, . . . 1362N may be stored on non-volatile computer readable memory of one or more computer systems that are connected to the network, such as a first computer system.

The system described in connection with FIG. 18A may also include one or more off-line keyset 1803, . . . 1803N. Each keyset includes a private key and a corresponding public key (or public address on the blockchain). The offline keyset 1803 may be stored in on non-volatile computer readable memory of one or more computer systems that are physically separated from network 15, blockchain 1807, administrator system 1801, and the one or more computer systems that store the on-line keysets, such as a second computer system. In embodiments, the second computer system that is physically separated and/or electronically may be a hardware storage module (HSM 1900—as described more fully in connection with FIG. 19B). The physical and/or electronic separation may serve as an additional security measure(s), protecting the one or more off-line keyset 1803, . . . 1803N from unauthorized access. In embodiments, the one or more off-line keyset 1803, . . . 1803N may be associated with address on the blockchain 1807. In embodiments, off-line keyset 1 1803 may be associated with off-line public address 1 1817. Off-line keyset 1803N may be associated with off-line public address N 1817.

Figure 18B:
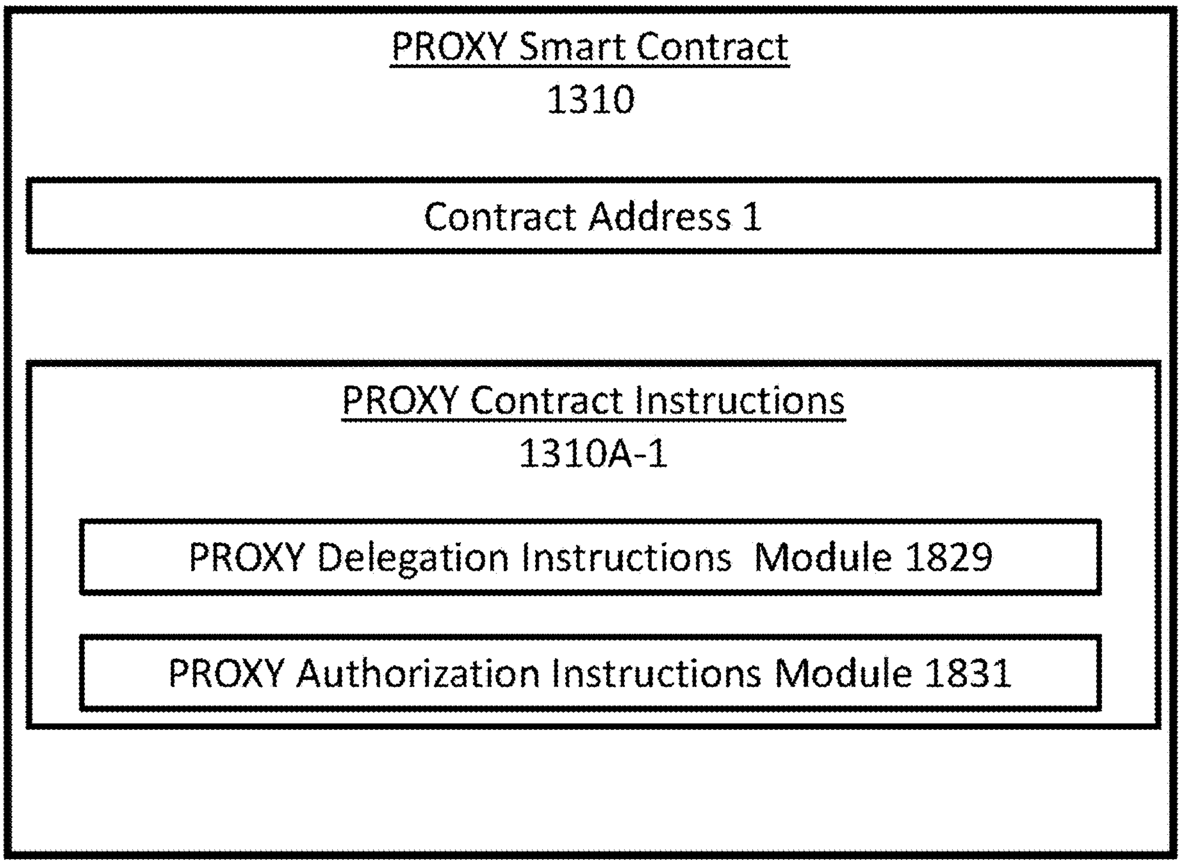
FIG. 18B is a schematic drawing of an exemplary proxy smart contract in accordance with exemplary embodiments of the present invention.

In embodiments, proxy smart contract 1310 may have a contract address (e.g., contract address 1) associated therewith on the blockchain 1807 proxy smart contract 1310. Proxy smart contract 1310, as seen in FIG. 18B, by way of illustration and as discussed in greater detail with respect to FIGS. 20A-20A-1, 20B-20C and 21A-21B, may include one or more modules of instructions 1310A-1 such as: (1) PROXY delegation instructions module 1829 (i.e., first delegation instructions module) and (2) PROXY authorization instructions module 1831 (i.e., first authorization instructions module), to name a few.

In embodiments, PROXY delegation instructions module 1829 (i.e., first delegation instructions module) may include one or more instructions to delegate received requests to other smart contracts on the blockchain, such as, for example, IMPL smart contract 1320 (contract address 2), PRINT LIMITER smart contract 1360 (contract address 3), STORE smart contract 1330 (contract address 4), CUSTODIAN 1 smart contract 1819 (contract address 5), CUSTODIAN 2 smart contract 1350 (contract address 6), CUSTODIAN 3 smart contract 1823 (contract address 7), to name a few. Additionally, in embodiments, PROXY delegation instructions module 1829 (i.e., first delegation instructions module) may include one or more instructions to delegate received requests to public addresses such as off-line public address 1 1817, off-line public address N 1817N, on-line public address 1 1825, on-line public address N 1825N, user 1 public address 1827, and/or User X public address 1827X, to name a few.

In embodiments, the first authorization instruction module 1831 may include instructions to authorize request received, the requests, in embodiments, being transaction requests from administrators, user public addresses, or other smart contracts, to name a few.

Figure 18C:
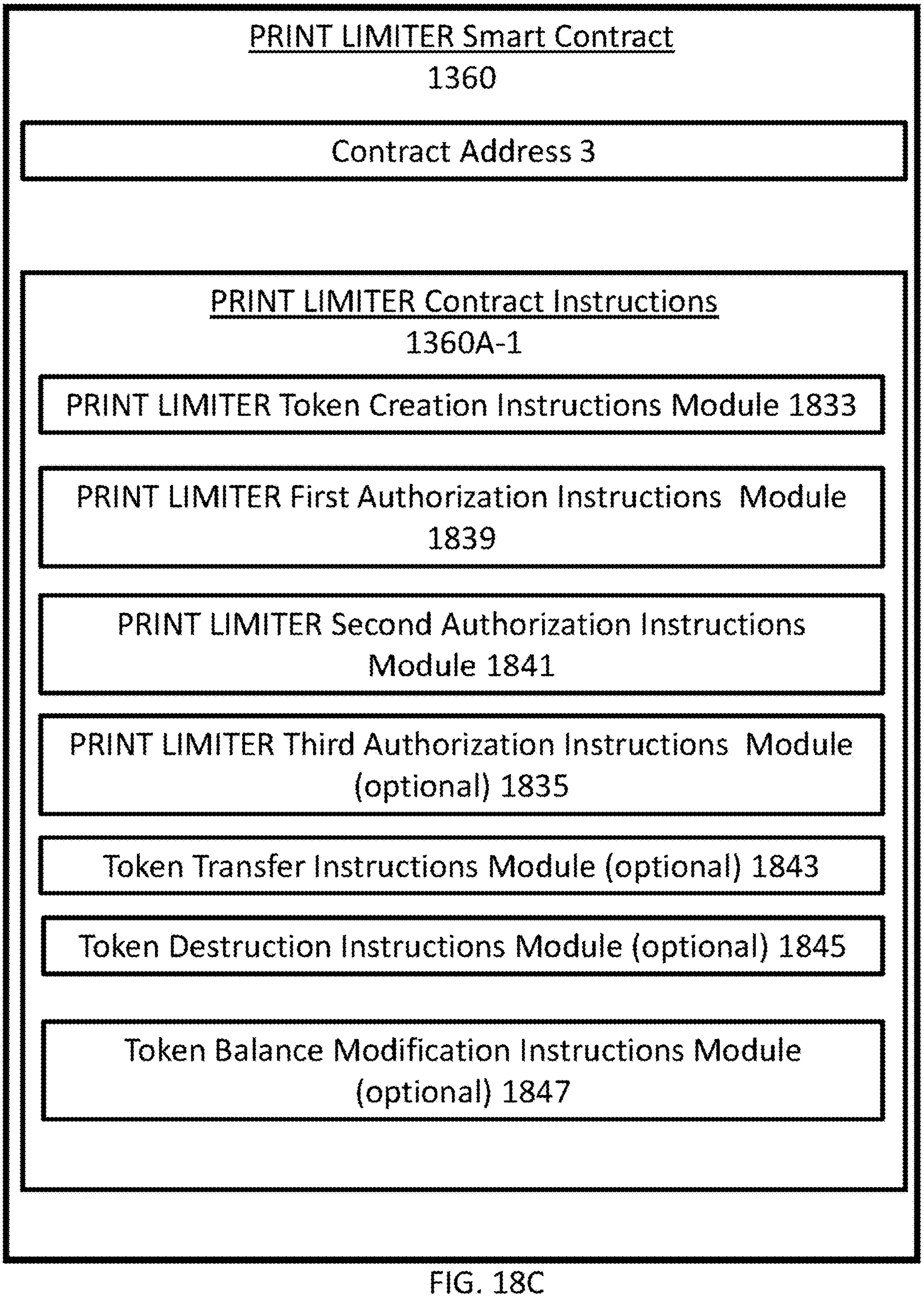
FIG. 18C is a schematic drawing of an exemplary print limiter contract in accordance with exemplary embodiments of the present invention.

In embodiments, PRINT LIMITER smart contract 1360 may have a contract address (e.g., contract address 3) associated therewith on the blockchain 1807. PRINT LIMITER smart contract 1360, as seen in FIG. 18C, by way of illustration and as discussed in greater detail with respect to FIGS. 20 and 21, may include one or more modules of instructions 1360A-1 such as: (1) PRINT LIMITER token creation instructions module 1833, (2), PRINT LIMITER first authorization instructions module 1839 (i.e., second authorization instructions module), (3) PRINT LIMITER second authorization instructions module 1841 (i.e., third authorization instructions module), (4) token transfer instructions module 1843, (5) token destruction instructions module 1845, and (6) token balance modification instructions module 1847.

In embodiments, PRINT LIMITER token creation instructions module 1833 may include one or more instructions that indicate conditions under which tokens of a digital asset token are created. In embodiments, the PRINT LIMITER token creation instructions module 1833 may include instructions that limit the conditions under which tokens may be created. For example, the PRINT LIMITER token creation instructions module 1833 may include instructions that limit the production of tokens to 1,000,000 tokens. In embodiments, the instructions may also include a temporal component. For example, the PRINT LIMITER token creation instructions module 1833 may include instructions that only allow 1,000 tokens to be created within a 24 hour period. Or, as another example, the PRINT LIMITER token creation instructions module 1833 may include instructions that only allow tokens to be created during business hours. In embodiments, the PRINT LIMITER may also include authorization instructions related to the first key pair.

In embodiments, custodian instructions module 1835 may include one or more instructions that limit the PRINT LIMITER smart contract 1360A authority. For example, if a request is received by the PRINT LIMITER smart contract 1360 to create digital asset tokens beyond a pre-approved token supply limit, the custodian instructions module 1835 may require authorization from a print limiter custodian (i.e., CUSTODIAN 2 smart contract 1350 (contract address 6)).

In embodiments, the second authorization instruction module 1839 and the PRINT LIMITER second authorization instructions module 1841 (i.e., third authorization instructions module) may each include instructions to authorize request received, the requests, in embodiments, being transaction requests from administrators, user public addresses, or other smart contracts, to name a few. Second authorization instruction module 1839 may include instructions for the first designated key pair (on-line keyset 1 1362, . . . 1362N), with respect to token creation of the digital asset token. In embodiments, the second authorization instructions with respect to token creation may be below a first threshold over a first period of time. PRINT LIMITER second authorization instructions module 1841 (i.e., third authorization instructions module) may include instructions for the second designated key pair (i.e., off-line keyset 1803, . . . 1803N) with respect to token creation of the digital asset token. In embodiments, PRINT LIMITER first authorization instructions module 1839 and PRINT LIMITER second authorization instructions module 1841 may be the same module.

In embodiments, the PRINT LIMITER Third Authorization Instructions Module 1835 may include instructions to modify the token supply. For example, the PRINT LIMITER Third Authorization Instructions Module 1835 may include instructions that, when called to execute, may create and/or burn tokens of the digital asset token. In embodiments, instructions that modify the token supply may cause the STORE Smart Contract 1330 to alter an electronic ledger that tracks the token supply.

In embodiments, the token transfer instructions module 1843, in embodiments, may include instructions to transfer digital asset tokens. In embodiments, the transfer may be from one public address to another public address. For example, a transfer of tokens may be from User 1 public address 1827 to User X public address 1827X. In embodiments, such transfer instructions may include rules by which certain transfer are allowed or blocked and may specify one or more key pair or contract addresses that may be authorized to perform one or more types of transfer operations. A more detailed description of the transfer of digital asset tokens is located in connection with the description of FIG. 19D, the same description applying herein.

In embodiments, the token destruction instructions module 1845 may include instructions on when, and with whose authority, security tokens associated with one or more specified addresses shall be destroyed or "burned", and thus removed from the security token supply. A more detailed description of token destruction is described in connection with FIG. 19E, the same description applying herein In embodiments, token balance modification instructions module 1847 may include instructions that may alter, edit, and/or update a transaction ledger in accordance with token creation, token transfer, and/or token destruction instructions (or modules), to name a few.

Figure 18D:
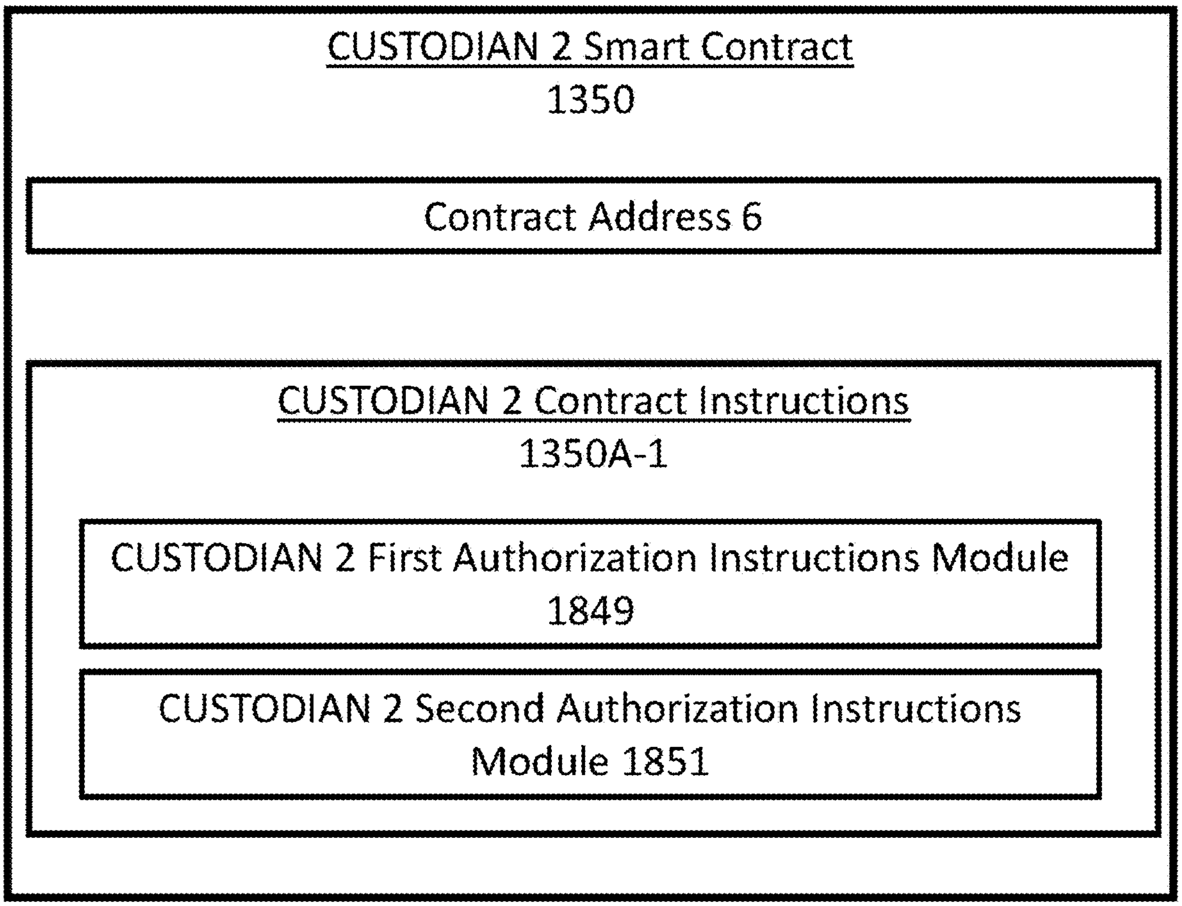
FIG. 18D is a schematic drawing of an exemplary custodian smart contract in accordance with exemplary embodiments of the present invention.

In embodiments, CUSTODIAN 2 smart contract may have a contract address (e.g., contract address 6) associated therewith on the blockchain 1807. CUSTODIAN 2 smart contract 1350, as seen in FIG. 18D, by way of illustration and as discussed in greater detail with respect to FIGS. 20 and 21, may include one or more modules of instructions 1350A-1 such as: (1) CUSTODIAN 2 first authorization instructions module 1849 (i.e., fourth authorization instructions module) and (2) CUSTODIAN 2 second authorization instructions module 1851 (i.e., fifth authorization instructions module). In embodiments, CUSTODIAN 2 first authorization instructions module 1849 and CUSTODIAN 2 second authorization instructions module 1851 may be the same module.

In embodiments, the CUSTODIAN 2 first authorization instructions module 1849 (i.e., fourth authorization instructions module) and the CUSTODIAN 2 second authorization instructions module 1851 (i.e., fifth authorization instructions module) may each include instructions to authorize request received, the requests, in embodiments, being transaction requests from administrators, user public addresses, or other smart contracts, to name a few CUSTODIAN 2 first authorization instructions module 1849 (i.e., fourth authorization instructions module) may include instructions for the off-line keyset 1803, . . . 1803N to authorize the issuance of instructions to the PRINT LIMITER smart contract 1360 with respect to token creation, above a first threshold during a first period of time. CUSTODIAN 2 second authorization instructions module 1851 (i.e., fifth authorization instructions module) may include instructions to raise a ceiling of token creation. A more detailed description of raising the ceiling of token creation is located below in the descriptions in connection with FIGS. 19A-B and 20A.

Figure 18E:
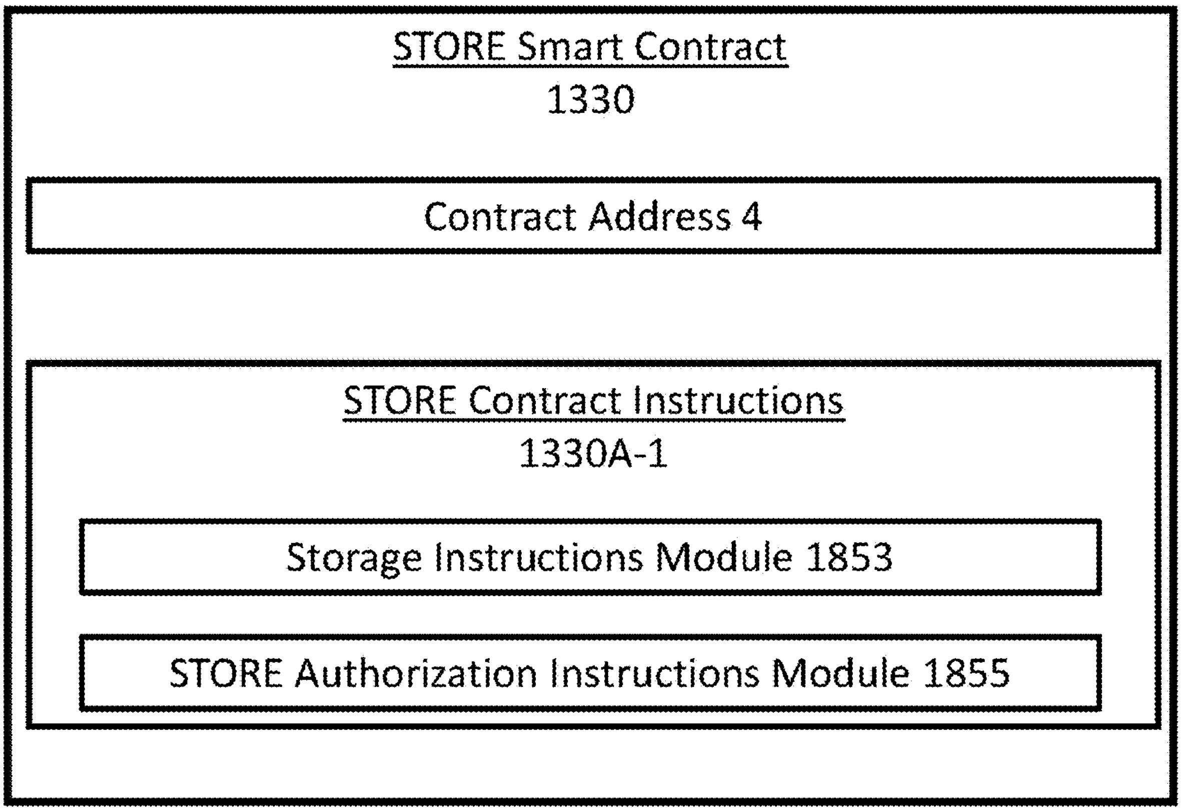
FIG. 18E is a schematic drawing of a store smart contract in accordance with exemplary embodiments of the present invention.

In embodiments, STORE smart contract 1330 may have a contract address (e.g., contract address 4) associated therewith on the blockchain 1807. STORE smart contract 1330, as seen in FIG. 18E, by way of illustration as discussed in greater detail with respect to FIGS. 20 and 21, may include one or more modules of instructions 1330A-1 such as: (1) storage instructions module 1853 and (2) STORE authorization instructions module 1855 (i.e., sixth authorization instructions module).

In embodiments, storage instructions module 1853, may include instructions to store any alterations, edits, or updates to a transaction ledger in accordance with token creation, token transfer, and/or token destruction. In embodiments, the storage instructions module 1853 may be called through a transaction request received from one or more smart contracts. For example, as shown in FIG. 19C, the IMPL smart contract 1320 may call the store smart contract 1330, authorizing the change of a transaction ledger to include an earlier transaction. In embodiments, the transaction ledger may be updated immediately after each token creation, transfer, and/or destruction. In embodiments, the storage instructions module 1853 may execute instructions to update a transaction ledger at certain times and/or dates. For example, the storage instructions module 1853 may only update a transaction ledger at the close of business. As another example, the storage instructions module 1853 may only update a transaction ledger at every second, minute, hour, or multiple hours, to name a few. A more detailed description of instructions related to the storage instructions module 1853 is located in connection with the descriptions of FIGS. 19-21, the same descriptions applying herein.

In embodiments, the STORE authorization instructions module 1855 may include instructions to authorize request received, the requests, in embodiments, being transaction requests from administrators, user public addresses, or other smart contracts, to name a few.

Figure 18F:
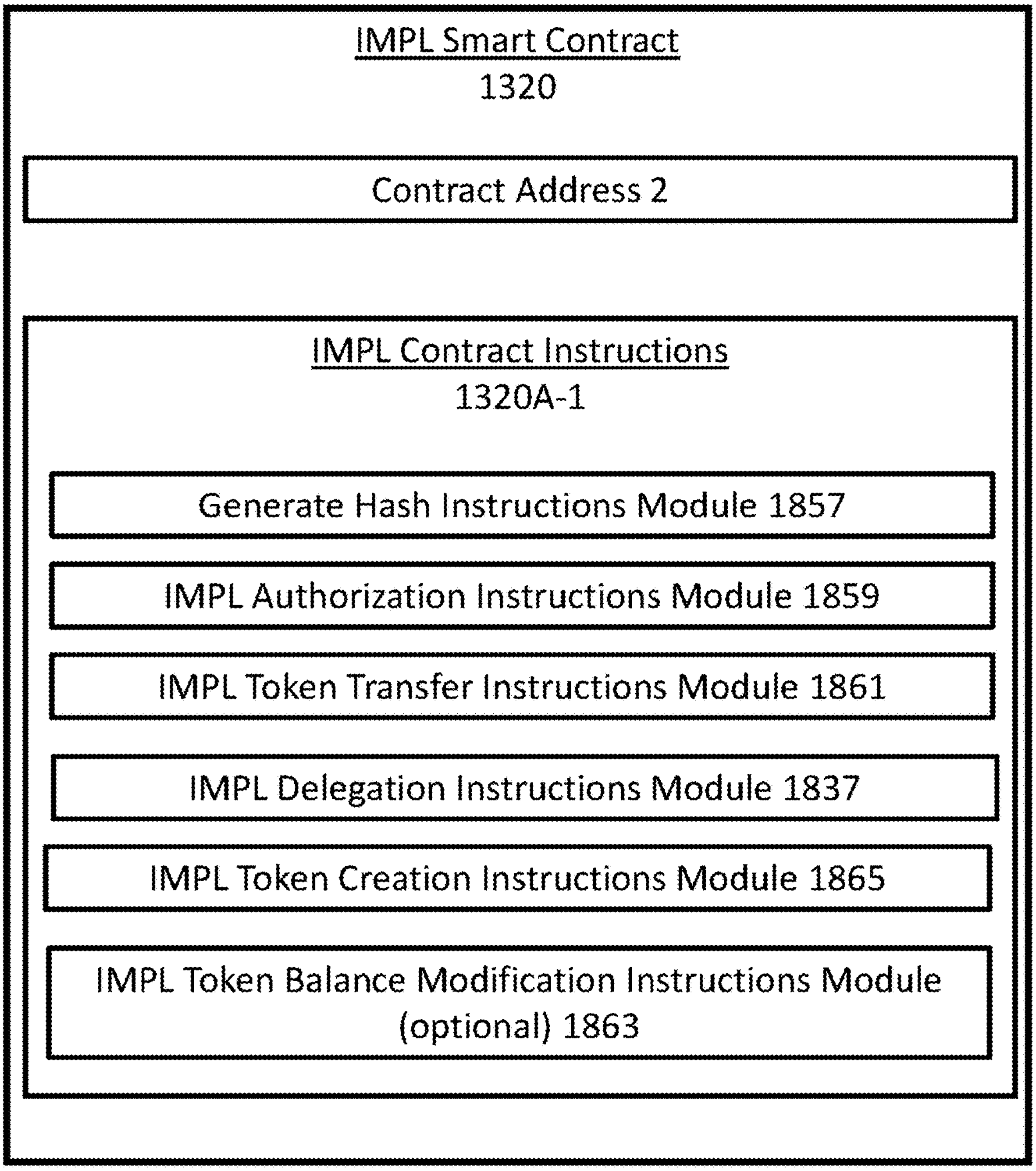
FIG. 18F is a schematic drawing of an impl smart contract in accordance with exemplary embodiments of the present invention.

In embodiments, IMPL smart contract 1320 may have a contract address (e.g., contract address 2) associated therewith on the blockchain 1807. The IMPL smart contract 1320, as seen in FIG. 18F, by way of illustration and discussed in greater detail with respect to FIGS. 19-21, may include one or more modules of instructions 1320A-1 such as: (1) Generate Hash Instructions Module 1857; (2) IMPL Authorization Instructions Module 1859; (3) IMPL Token Transfer Instructions Module 1861; (4) IMPL Token Balance Modification Instructions Module 1863; (5) IMPL delegation instructions module 1837 (i.e., second delegation instructions module); and (6) IMPL Token Creation Instructions Module 1865.

In embodiments, the generate hash instructions module 1857 may include instructions to generate a unique hash. A unique hash may be generated by the generate hash instructions module 1857 by applying a hash algorithm. Examples of hash algorithms include MD 5, SHA 1, SHA 256, RIPEMD, and Keccak-256, to name a few. Hash algorithms take an input of any length and create an output of fixed length, allowing the trade instructions to be detectable and usable by administrators and users on the underlying blockchain.

In embodiments, the IMPL authorization instructions module 1859 may include instructions to authorize request received, the requests, in embodiments, being transaction requests from administrators, user public addresses, or other smart contracts, to name a few. In embodiments, the requests may include requests to generate digital asset tokens from administrators, user public addresses, and/or other smart contracts, to name a few.

In embodiments, the IMPL token transfer instructions module 1861 may include instructions to transfer digital asset tokens. In embodiments, the transfer may be from one public address to another public address. For example, a transfer of tokens may be from User 1 public address 1827 to User X public address 1827X. In embodiments, such transfer instructions may include rules by which certain transfer are allowed or blocked and may specify one or more key pair or contract addresses that may be authorized to perform one or more types of transfer operations. In embodiments, the IMPL token transfer instructions module 1861 may be similar to the token transfer instructions module 1843, described in connection with FIG. 18C. In embodiments, a transfer of digital asset tokens using the blockchain 1807 may be accomplished using either the IMPL token transfer instructions module 1861 or the token transfer instructions module 1843. In embodiments, a transfer of digital asset tokens using the blockchain 1807 may be accomplished using both the IMPL token transfer instructions module 1861 and the token transfer instructions module 1843. In embodiments, the IMPL smart contract 1320 and the PRINT LIMITER smart contract 1360 may be the same smart contract. A more detailed description of the transfer of digital asset tokens is located in connection with the description of FIG. 19D, the same description applying herein.

In embodiments, IMPL token balance modification instructions module 1863 may include instructions that may alter, edit, and/or update a transaction ledger in accordance with token creation, token transfer, and/or token destruction instructions (or modules), to name a few. In embodiments, the IMPL token balance modification instructions module 1863 may be similar to the token balance modification module 1847 described in connection with FIG. 18C. In embodiments, a token balance modification may be accomplished using either the token balance modification module 1847 or the IMPL token balance modification module 1863. In embodiments, a token balance modification may be accomplished using both the token balance modification module 1847 and the IMPL token balance modification module 1863. A more detailed description of a token balance modification is located in connection with the description of FIGS. 19-21, the same descriptions applying herein.

In embodiments, IMPL delegation instructions module 1837 (i.e., second delegation instructions module) may include one or more instructions to delegate received requests to other smart contracts, such as, for example, contract address 1 (proxy smart contract) 1809, PRINT LIMITER smart contract 1360 (contract address 2), STORE smart contract 1330 (contract address 4), CUSTODIAN 1 smart contract 1819 (contract address 5), CUSTODIAN 2 smart contract 1350 (contract address 6), CUSTODIAN 3 smart contract 1823 (contract address 7), off-line public address 1 1817, off-line public address N 1817N, on-line public address 1 1825, on-line public address N 1825N, user 1 public address 1827, and/or User X public address 1827X. PRINT LIMITER delegation instructions module 1837 (i.e., second delegation instructions module) may include instructions for delegating to one or more designated store contract addresses data storage operations or other functions for the digital asset token as authorized by the first designated custodian contract address.

In embodiments, the IMPL token creation module 1865 may include one or more instructions to create digital asset tokens, and thus add to the token supply. Such instructions may specify one or more authorized key pairs or contract addresses that may be authorized to request creation of security tokens under specified conditions (such as one or more on-line keysets 1362, . . . 1362N). In embodiments, the token creation instructions module 1833 may include instructions related to increasing the token supply. In embodiments, the token creation instructions module 1865 may include instructions on how to create new digital asset tokens within pre-approved token supply limits and how to assign newly created or "minted" tokens to specific designated public addresses or contract addresses on the underlying blockchain. In embodiments, the IMPL token creation module 1865 may cause the IMPL Smart Contract 1320 to communicate with STORE Smart contract 1330, the IMPL Smart Contract 1320 sending a transaction request to the Store Smart Contract 1330, causing the Store Smart Contract 1330 to alter a ledger, or otherwise record an increase or decrease in the token supply of a digital asset token.

Figure 20A:
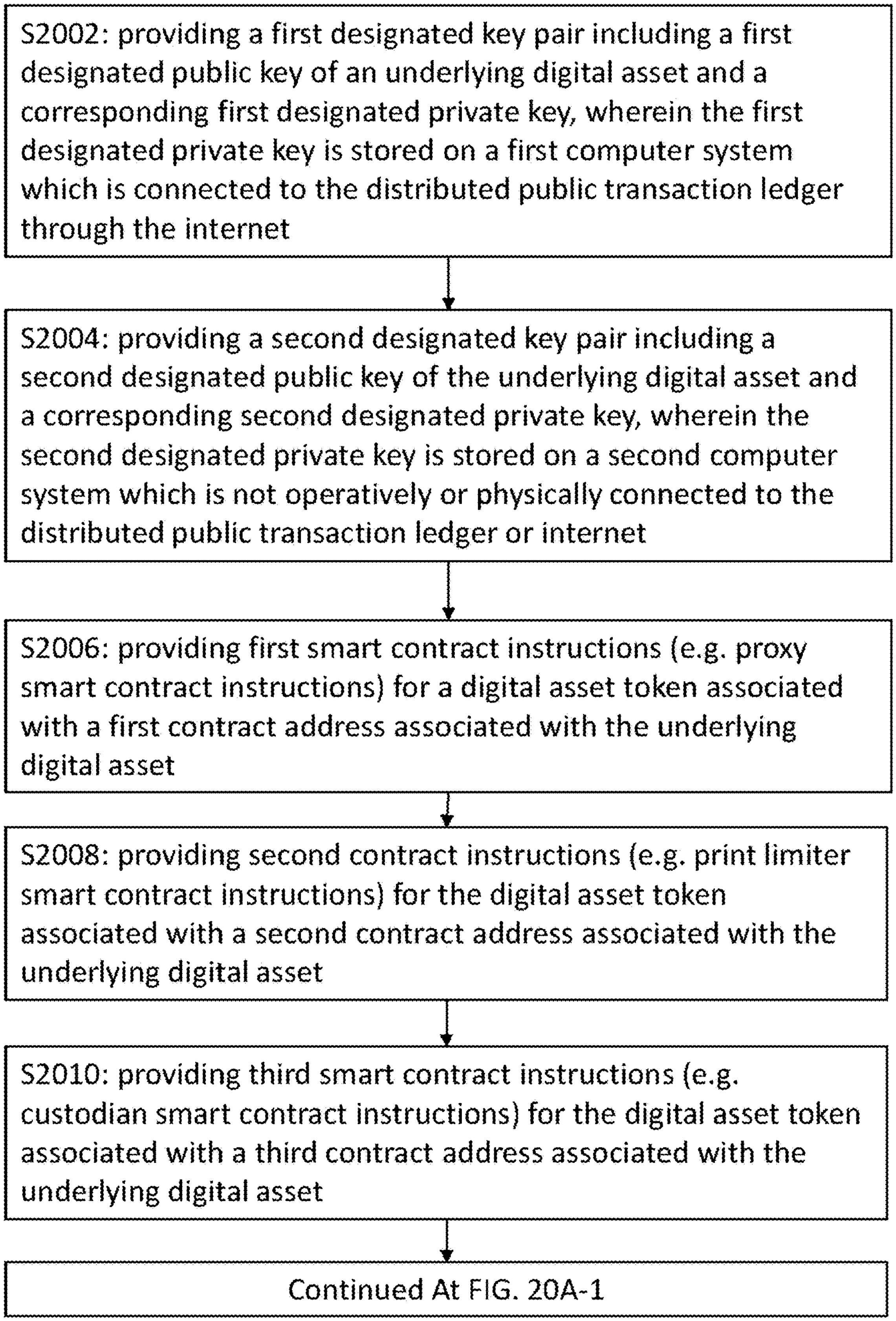
FIG. 20A is a flowchart of an exemplary process of increasing a supply of tokens of a digital asset token using off-line keys in accordance with exemplary embodiments of the present invention.

Referring to FIG. 20A, in step S2002, a first designated key pair (on-line keyset 1 1362) including a first public key of an underlying digital asset and a corresponding first designated private key is provided. In embodiments, the underlying digital asset is maintained on a distributed public transaction ledger maintained by a plurality of geographically distributed computer systems in a peer-to-peer network in the form of the blockchain 1807. In embodiments, the first designated private key is stored on a first computer system which is connected to the distributed public transaction ledger 15). In embodiments, the first designated key pair may be multiple on-line keys with multiple electronic signatures.

In step S2004, a second designated key pair including a second designated public key (off-line keyset 1803) of the underlying digital asset and a corresponding second designated private key is provided. In embodiments, the second designated private key is stored on a second computer system which is physically separated from the first computer system and is not operatively or physically connected to the distributed public transaction ledger or the internet (network 15). In embodiments, the second computer system may be the hardware storage module 1900. In embodiments, the second designated key pair may be multiple on-line keys with multiple electronic signatures.

In step S2006, first smart contract instructions for a digital asset token associated with a first contract address associated with the blockchain associated with the underlying digital asset are provided. In embodiments, the first contract address is contract address 1 (proxy smart contract) 1809 and first smart contract instructions of step S2006 are the proxy contract instructions 1310A-1, both described in connection with FIG. 18B. The first smart contract instructions may be saved in the blockchain 1807 and include first delegation instructions and first authorization instructions. The first delegation instructions may delegate one or more first functions associated with the digital asset token to one or more delegated contract addresses associated with the underlying digital asset, the delegated contract addresses, in embodiments, being different than the first contract address.

In embodiments, the first delegation instructions may be located with first delegation instruction module 1829 described in connection with FIG. 18B. In embodiments, the first smart contract instructions, may also include first authorization instructions for the second designated key pair. In embodiments, the first authorization instructions may be located with first authorization instructions module 1830 described in connection with FIG. 18B.

In step S2008, second smart contract instructions for the digital asset token associated with a second contract address associated with the blockchain associated with the underlying digital asset may be provided. In embodiments, the second smart contract address is at contract address 3 (print limiter smart contact) 1813 and the second smart contract instructions are the print limiter contract instructions 1360A-1, both described in connection with FIG. 18C. In embodiments, the second contract address is different from the first contract address. In embodiments, the second smart contract instructions may be saved in the blockchain 1807 and, as described in connection with the print limiter contract instructions 1360A-1 of FIG. 18C (the descriptions of which applying herein), include: (1) token creation instructions; (2) custodian instructions; (3) second delegation instructions; (4) second authorization instructions; and (5) third authorization instructions. In embodiments, as described above in connection with print limiter contract instructions 1360A-1 of FIG. 18C (the description of which applying herein), the second smart contract instructions may also include: (6) token transfer instructions of token transfer instructions module 1843 to transfer tokens of the digital asset token from a first designated address to a second designated address.

In embodiments, as described above in connection with print limiter contract instructions 1360A-1 of FIG. 18C (the description of which applying herein), the second smart contract instructions may also include: (7) token destruction instructions of token destruction instructions module 1845 to destroy one or more tokens of the digital asset token. Token destruction instructions, in embodiments, may not be limited to print limiter contract instructions 1360A-1. In embodiments, additional smart contracts may also destroy tokens, such as IMPL smart contract 1320 (contract address 2), CUSTODIAN 1 smart contract 1819 (contract address 5), CUSTODIAN 2 smart contract 1350 (contract address 6), and/or CUSTODIAN 3 smart contract 1823 (contract address 7), to name a few.

In embodiments, as described above in connection with print limiter contract instructions 1360A-1 of FIG. 18C (the description of which applying herein), the second smart contract instructions may also include: (8) token balance modification instructions of token balance modification instructions module 1847 to modify a total number of tokens of the digital asset token assigned to a third designated address.

In step S2010, third smart contract instructions for the digital asset token associated with a third contract address associated with the blockchain associated with the underlying digital asset are provided. In embodiments, the third smart contract address is CUSTODIAN 2 smart contract 1350 (contract address 6) and the second smart contract instructions are the custodian 2 contract instructions 1350A-1, both described in connection with FIG. 18D. The third smart contract instructions may be saved in the blockchain 1807 and, as described in connection with the custodian 2 smart contract instructions 1350A-1 of FIG. 18D (the descriptions of which applying herein), include: (1) fourth authorization instructions and (2) fifth authorization instructions. The fourth authorization instructions of CUSTODIAN 2 first authorization instructions module 1849 (i.e., fourth authorization instructions module) may include instructions for the second designated key pair to authorize the issuance of instructions to the second smart contract instructions with respect to token creation. In embodiments, the authorization instructions with respect to token creation may be above the first threshold during the first time period.

In embodiments, a token creation request may exceed a ceiling (i.e., a request for 150 tokens when the ceiling is 100 tokens), CUSTODIAN 2 smart contract 1350 may authorize an increase in the ceiling. This authorization may be fifth authorization instructions of the CUSTODIAN 2 second authorization instructions module 1851 (i.e., fifth authorization instructions module), and may include instructions for the second designated key pair (off-line keyset 1803, . . . 1803N) to authorize the issuance of instructions to the first smart contract instructions to change the one or more designated contract address from the second contract address to a different designated contract address. In embodiments, a ceiling is raised by creating a second print limiter smart contract on the blockchain 1807 with a higher ceiling. Once the second print limiter smart contract is created, the request for token creation can be routed to the second print limiter smart contract.

Figure 19A:
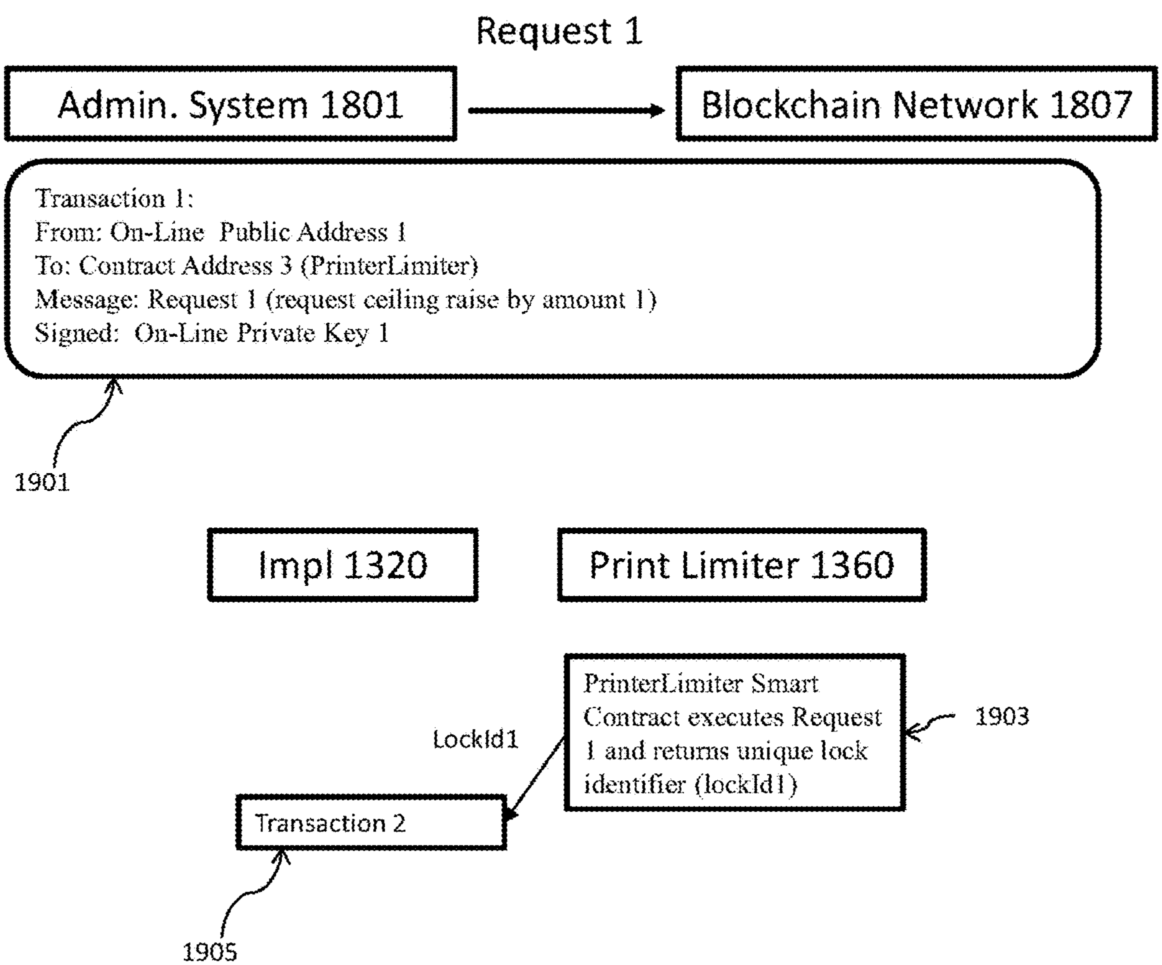
FIG. 19A is a schematic drawing of an exemplary process for increasing the ceiling of a print limiter in accordance with exemplary embodiments of the present invention.
Figure 19B:
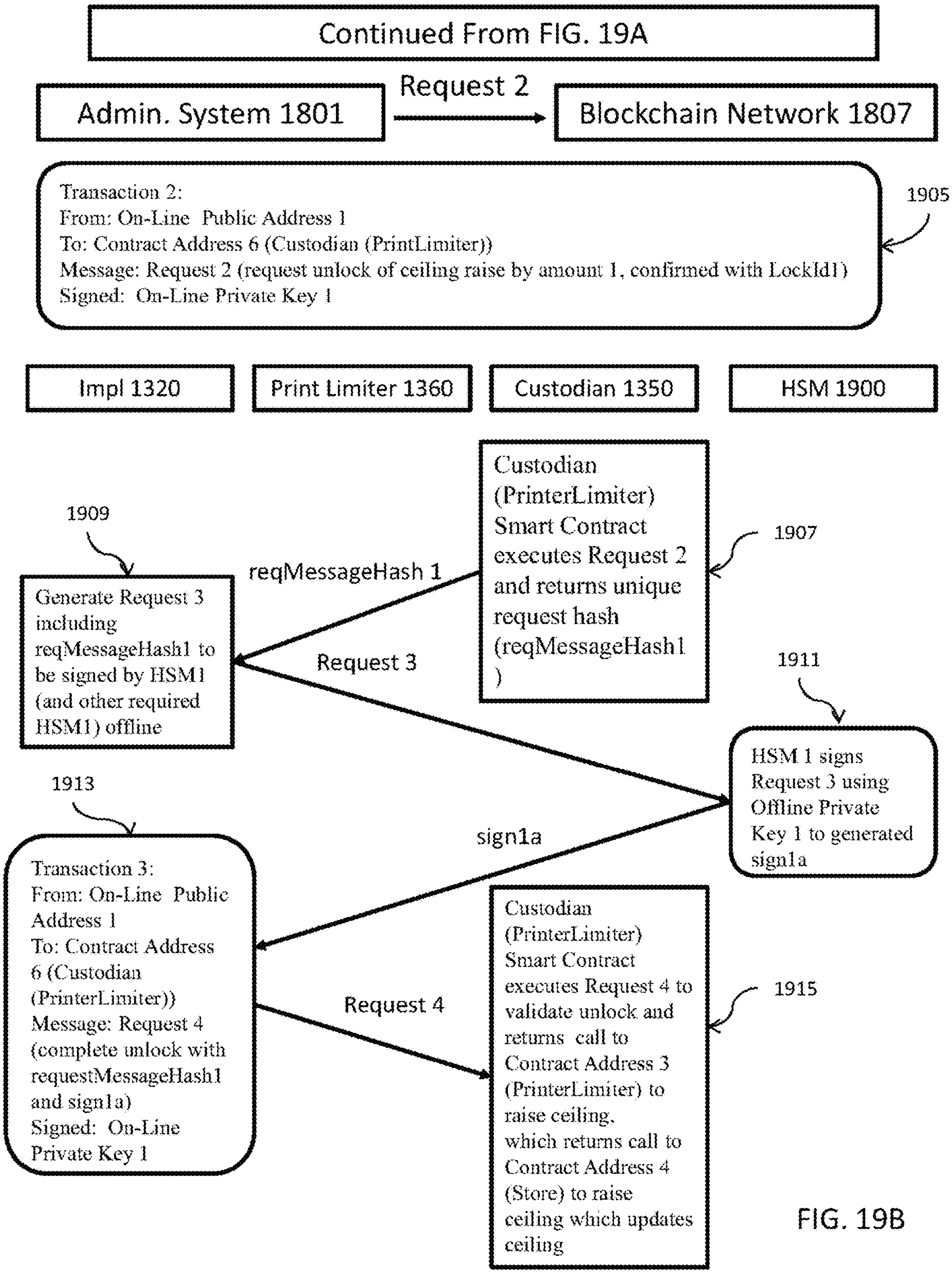
FIG. 19B is a schematic drawing of an exemplary process for increasing the ceiling of a print limiter in accordance with exemplary embodiments of the present invention.
Figure 19C:
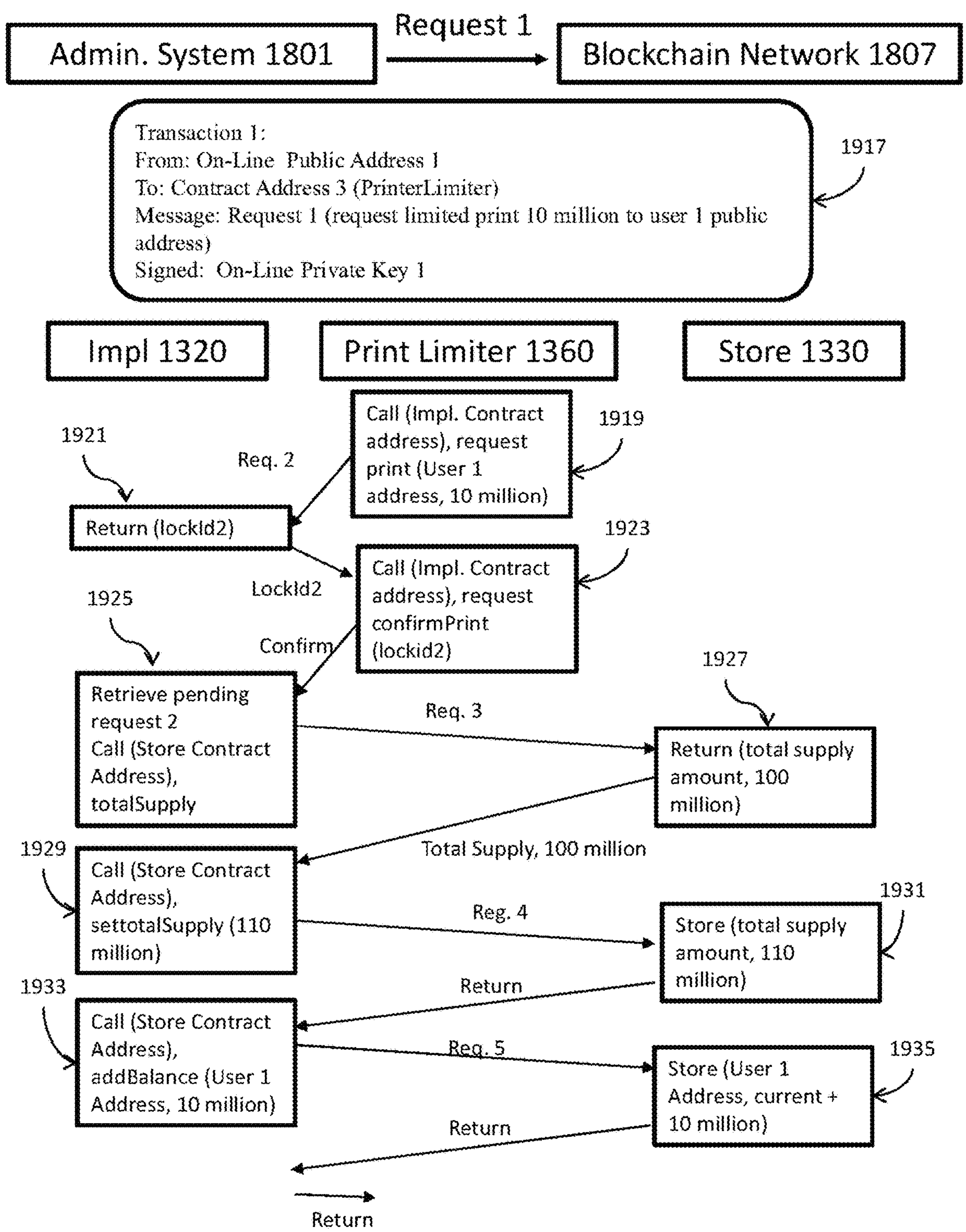
FIG. 19C is a schematic drawing of an exemplary process of limiting the print limiter with respect to a public address in accordance with exemplary embodiments of the present invention.

A more detailed description of the process of raising the token creation ceiling is located in connection with FIGS. 19A-B. FIGS. 19A-B are schematic drawings of an exemplary process for increasing the ceiling of a print limiter in accordance with exemplary embodiments of the present invention. The exemplary process starts with administrator system 1801 sending a first transaction request 1901 from on-line public address 1 1825 to PRINT LIMITER smart contract 1360 (contract address 3). In embodiments, the transaction request 1901 includes a request to raise the ceiling by amount 1. In embodiments, the first transaction request 1901 is signed by on-line private key 1. In embodiments, on-line private key 1 is mathematically related to on-line public address 1 1825.

In response to receiving the first transaction request, the print limiter 1813 executes the first transaction request 1903 and returns a unique lock identifier (LockId1) to IMPL smart contract 1320 (contract address 2).

Next, referring to FIG. 19B, a second transaction request 1905 may be sent from the on-line public address 1825 to contract address 6 (custodian (print limiter)) 1821. In embodiments, the second transaction request 1905 includes a request to unlock ceiling raise by amount 1, the request being confirmed with the lockID received in step 1903. In embodiments, the second transaction request 1905 is signed by on-line private key 1.

In response to receiving the second transaction request, custodian 1821 executes the second transaction request 1907 and returns a unique hash (reqMessageHash1). The unique hash may be generated by applying a hash algorithm. Examples of hash algorithms include MD 5, SHA 1, SHA 256, RIPEMD, and Keccak-256 to name a few. Hash algorithms take an input of any length and create an output of fixed length, allowing the trade instructions to be detectable and usable by administrators and users on the underlying blockchain. However, applying a hash algorithm is not always necessary if trade instructions are published ahead of time.

In response to the returned unique hash, a third transaction request is generated 1909. The third transaction request may include a request that the reqMessageHash1 to be signed by HSM 1900 offline.

The third request then may be sent 1911 to HSM 1900 and signed using offline private keyset 1803. The signed request may be returned to administrator system 1801.

After returning the signed transaction request, the third transaction request may be sent 1913 from the on-line public address 1825 to contract address 6 (custodian (print limiter)) 1821. The third transaction request may include a fourth request to complete the unlock with requestMessageHash1 with the HSM signature. In embodiments, the fourth request is signed by on-line private key 1.

After receiving the fourth request, custodian 1821 may execute the request to validate the unlock and return call to contract address 3 (print limiter) 1813 to raise the ceiling, which returns call to contract address 4 (store) 1815 to raise ceiling which updates ceiling.

The process of FIG. 20A may continue with step S2012 of FIG. 20A-1. In step S2012, fourth smart contract instructions for the digital asset token associated with a fourth contract address associated with the blockchain associated with the underlying digital asset are provided. In embodiments, the fourth contract address is STORE smart contract 1330 (contract address 4) and fourth smart contract instructions of step S2012 are the store contract instructions 1330A-1, both described in connection with FIG. 18E. The fourth smart contract instructions may include: (1) storage instructions and (2) sixth authorization instructions. In embodiments, storage instructions of storage instructions module 1853 may include instructions for transaction data related to the digital asset token to be stored. The transaction data may include (for all issued tokens of the digital asset token): (1) public address information associated with the underlying digital asset; and (2) corresponding token balance information associated with said public address information. In embodiments, sixth authorization instructions of authorization instructions module 1855 may include instructions for modifying the transaction data in response to request from the second contract address (print limiter 1813).

The process may continue with step S2013. At step S2013, fifth smart contract instructions for the digital asset token for the digital asset token associated with the blockchain associated with the underlying digital asset are provided. In embodiments, the fifth contract address is the IMPL smart contract 1320 (contract address 2) and the fifth smart contract instructions of step S2013 are the IMPL Contract instructions 1320A-1, both described in connection with FIG. 18F. In embodiments, the fifth smart contract instructions may be saved in the blockchain for the underlying digital assets and may include (1) token creation instructions to create tokens of the digital asset tokens under conditions set forth by the print limiter token creation instructions; and (2) second delegation instructions for delegating to another contract address, data storage operations. In embodiments, instructions from the PRINT LIMITER Token Creation Instructions Module 1833 may set conditions for the token creation instructions included with the fourth smart contract instructions (i.e., instructions included in the IMPL Token Creation Instructions Module 1865).

The process described in FIG. 20A-1 may continue with step S2014. At step S2014, a digital asset token issuer system increases the total supply of the digital asset token from a first amount to a second amount. Step S2014 is described in more detail in connection with FIGS. 20B-C. Increasing the total supply of the digital asset token may being with step S2018. At step S2018, a first transaction request may be generated by the digital asset token issuer system. The generated transaction request may include a first message including a first request to increase the total supply of the digital asset token to a second amount of digital asset tokens. The first transaction request being from the on-line public key address 1825 to the fifth contract address (IMPL 1320). In embodiments, the first transaction request may be signed by the first on-line private key.

In step S2020 the first transaction request is sent by the digital asset token issuer system, from the on-line public key address 1825 to the fifth contract address (IMPL 1320).

Next, in step S2021, the first transaction request is sent by the digital asset token issuer system via the underlying blockchain from the fifth contract address (IMPL 1320) to the second contract address (PRINT LIMITER 1360). In embodiments, the second contract address (PRINT LIMITER 1360) executes, via the blockchain 1807, the first transaction request to return a first unique lock identifier associated with the first transaction request. In embodiments, the first transaction request may include first transaction fee information for miners in the blockchain network to process the first transaction request.

Next, in step S2022, the first unique lock identifier may be obtained by the digital asset token issuer system, based on reference to the blockchain 1807.

In step S2024, a second transaction request may be generated by the digital asset token issuer system. The generated transaction request may include a second message including a second request to unlock the total supply of the digital asset token in accordance with the first request including the first unique lock identifier. The second transaction request being from the on-line public key address 1825 to the third contract address (custodian (print limiter) 1350). In embodiments, the second transaction request may be signed by the first on-line private key.

In step S2026 the second transaction request is sent by the digital asset token issuer system, from the on-line public key address 1825 to the third contract address (custodian (print limiter) 1350). In embodiments, the third contract address (custodian (print limiter) 1350) executes, via the blockchain 1807, the first transaction request to return a first unique lock identifier associated with the second transaction request to return a first unique request hash associated with the second transaction request. In embodiments, the first transaction request may include second transaction fee information for miners in the blockchain network to process the second transaction request.

Next, in step S2028, the first unique request hash is obtained, by the digital asset token issuer system, based on reference to the blockchain 1807.

Figure 20C:
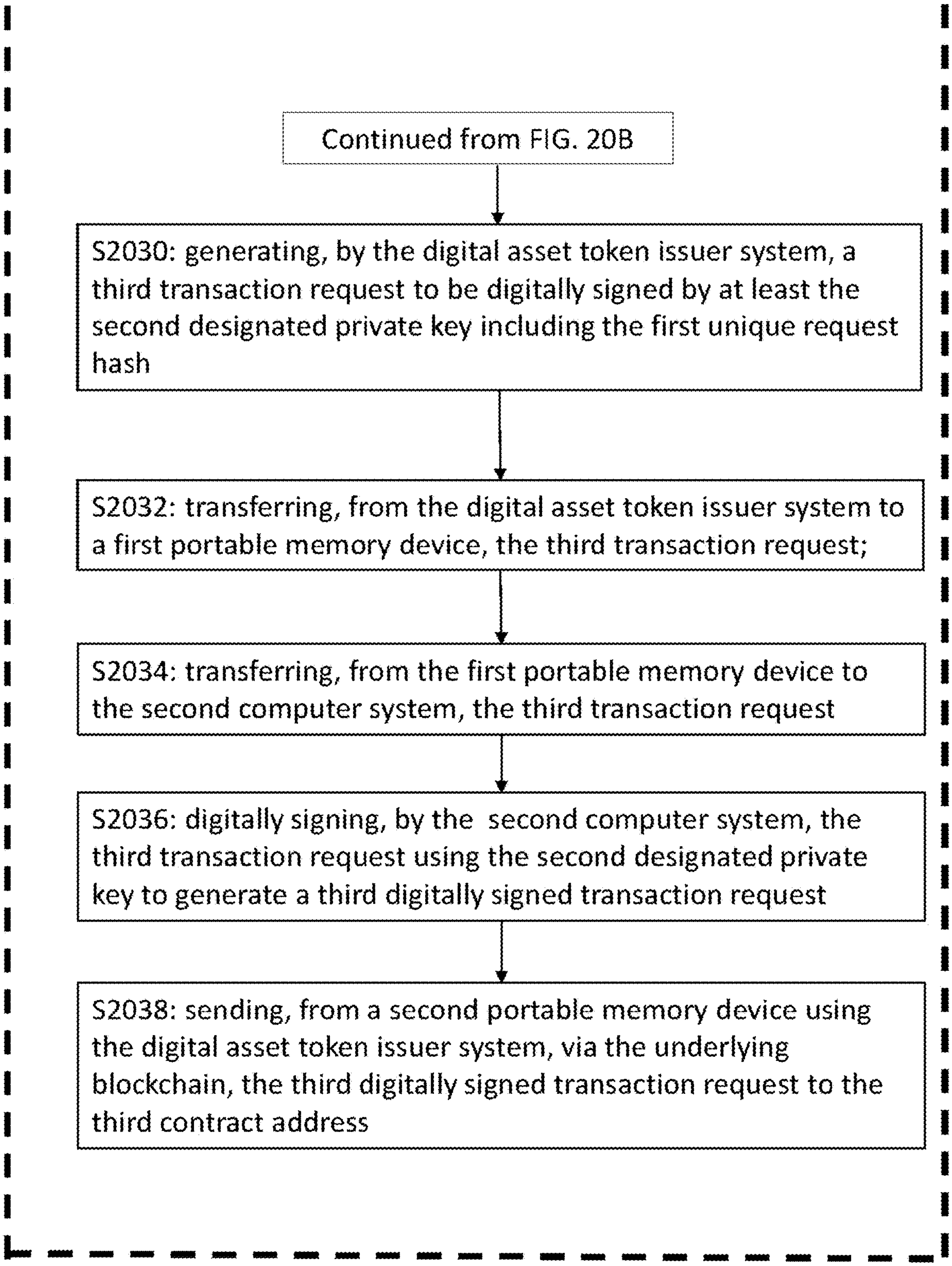
FIG. 20C is another flowchart of an exemplary process of increasing the total supply of tokens of a digital asset token in accordance with exemplary embodiments of the present invention.

The process described in FIG. 20B may continue with step S2030 of FIG. 20C. At step S2030, a third transaction request is generated by the digital asset token issuer system. The third transaction request may be digitally signed by at least the second designated private key (off-line keyset 1803) including the first unique request hash.

Next, at step S2032, the third transaction request is transferred from the digital asset token issuer system to a first portable memory device. A portable memory device may, in embodiments, be a flash drive, USB drives, external hard drives, and/or portable CD/DVD-ROM drives, to name a few.

At step 2034, the third transaction request is transferred from the first portable memory device to the second computer system. Next, at a step S2036, the third transaction request is digitally signed using the second designated private key (off-line keyset 1803) to generate a third digitally signed transaction request.

The process of FIGS. 20B and 20C may continue with step S2038. At step S2038, the third digitally signed transaction request is sent from a second portable memory device using the digital asset token issuer system to the third contract address (custodian (print limiter) 1350).

In embodiments, the first portable memory device is the second portable memory device. In embodiments, the first portable memory device is not the second portable memory device. In embodiments, the third digitally signed transaction request is returned to the STORE smart contract 1330. Once returned to the STORE smart contract 1330, the third digitally signed transaction request is returned to the print limiter 1813.

Referring back to FIG. 20A-1, the process may continue with step S2016. At step S2016, the digital asset token issuer system confirms that the total supply of digital asset tokens is set to the second amount. In embodiments, the third smart contract (custodian (print limiter) 1350) executes, via the blockchain network, the third digitally signed transaction request to validate the second request to unlock based on the third digitally signed transaction request and the first unique request hash and executes a first call to the second contract address (PRINT LIMITER 1360), to increase the total supply of the digital asset token to the second amount of digital asset tokens. In embodiments, the second contract address (PRINT LIMITER 1360) may return the first call to the fifth contract address (IMPL 1320). In embodiments, the fifth smart contract (IMPL 1320) executes, via the blockchain network, a second call to the fourth smart contract address (STORE 1330) to set the total supply of the digital asset tokens to the second amount of digital asset tokens. In embodiments, the fourth smart contract (STORE 1330) executes, via the blockchain, the second call to set the total supply of the digital asset tokens to the second amount of digital asset tokens.

In embodiments, the steps of FIGS. 20A and 20B may be rearranged and/or omitted.

Merely for the purposes of description, the following example is provided.

Example 1

Increase the Supply Ceiling by 100 Million Cents

Tx 1.
TO = address of PrintLimiter
DATA = ‘requestCeilingRaise(100,000,000)’
(Tx would be signed by Adminstrator’s ‘primary’ key, although there are no restrictions on who can call this function.)
Execution produces a unique lock identifier, say ‘lockId1’.

Tx 2.
TO = address of (Print)Custodian (instance of the Custodian contract, with cold tier keys, intended to be the offline custodian of printing operations)
DATA = ‘requestUnlock(lockId1, address of PrintLimiter, selector for functionconfirmCeilingRaise, ...and a detail I’m going to omit... )’
(Tx would be signed by Adminstrator’s ‘primary’ key, although there are no restrictions on who can call this function. If it’s not the primary key there is an anti-spam mechanism.)
Execution produces a unique request hash, say ‘reqMsgHash1’.
2 of the offline keys set up with (Print)Custodian sign ‘reqMsgHash1’; we’ll name the signatures ‘sig1_a’ and ‘sig1_b’.

Tx 3.
TO = address of (Print)Custodian
DATA = ‘completeUnlock(requestMsgHash1, sig1_a, sig1_b)’
(Tx would be signed by Adminstrator’s ‘primary’ key, although there are no restrictions on who can call this function.)
Execution validates the signatures (and enforces other details around time locks and revocation).
Next, it executes a call to PrintLimiter and its confirmCeilingRaise (NOTE that those two detailed were fixed in Tx2 as parameters to the call to requestUnlock).
CALL ‘(address of PrintLimiter).confirmCeilingRaise(lockId1)’
Execution continues in PrintLimiter in the function ‘confirmCeilingRaise’.
Storage for the contract is updated:
STORE supply ceiling = current supply ceiling + 100,000,000

FIG. 21A is a flowchart of an exemplary process of increasing the total supply of digital asset tokens in accordance with exemplary embodiments of the present invention. The process of FIG. 21A may begin with step S2102. In step S2102, a first designated key pair (on-line keyset 1 1362) including a first public key of an underlying digital asset and a corresponding first designated private key is provided. In embodiments, the underlying digital asset is maintained on a distributed public transaction ledger maintained by a plurality of geographically distributed computer systems in a peer-to-peer network in the form of the blockchain 1807. In embodiments, the first designated private key is stored on a first computer system which is connected to the distributed public transaction ledger through the internet (network 15). In embodiments, the first designated key pair may be multiple on-line keys with multiple electronic signatures.

In step S2104, a second designated key pair including a second designated public key (off-line keyset 1803) of the underlying digital asset and a corresponding second designated private key is provided. In embodiments, the second designated private key is stored on a second computer system which is physically separated from the first computer system and is not operatively or physically connected to the distributed public transaction ledger or the internet (network 15). In embodiments, the second computer system may be the hardware storage module 1900. In embodiments, the second designated key pair may be multiple on-line keys with multiple electronic signatures.

In step S2106, first smart contract instructions for a digital asset token associated with a first contract address associated with the blockchain associated with the underlying digital asset are provided. In embodiments, the first contract address is contract address 1 (proxy smart contract) 1809 and first smart contract instructions of step S2106 are the proxy contract instructions 1310A-1, both described in connection with FIG. 18B. The first smart contract instructions, may, be saved in the blockchain 1807 and include first delegation instructions and first authorization instructions. The first delegation instructions may delegate one or more first functions associated with the digital asset token to one or more delegated contract addresses associated with the underlying digital asset, the delegated contract addresses, in embodiments, being different than the first contract address. The first delegation instructions may be located with first delectation instructions module 1829 described in connection with FIG. 18B. The first smart contract instructions, may also include first authorization instructions for the second designated key pair. The first authorization instructions may be located with first authorization instructions module 1830 described in connection with FIG. 18B.

In step S2108, second contract instructions for the digital asset token associated with a second contract address associated with the blockchain associated with the underlying digital asset is provided. In embodiments, the second smart contract address is contract address 3 (print limiter smart contact) 1813 and the second smart contract instructions are the print limiter contract instructions 1360A-1, both described in connection with FIG. 18C. In embodiments, the second contract address is not the first contract address. The second smart contract instructions may be saved in the blockchain 1807 and, as described in connection with the print limiter contract instructions 1360A-1 of FIG. 18C (the descriptions of which applying herein), include: (1) token creation instructions; (2) custodian instructions: (3) second delegation instructions: (4) second authorization instructions; and (5) third authorization instructions. In embodiments, as described above in connection with print limiter contract instructions 1360A-1 of FIG. 18C (the description of which applying herein), the second smart contract instructions may also include: (6) token transfer instructions of token transfer instructions module 1843 to transfer tokens of the digital asset token from a first designated address to a second designated address.

In embodiments, as described above in connection with print limiter contract instructions 1360A-1 of FIG. 18C (the description of which applying herein), the second smart contract instructions may also include: (7) token destruction instructions of token destruction instructions module 1845 to destroy one or more tokens of the digital asset token. Token destruction instructions, in embodiments, may not be limited to print limiter contract instructions 1360A-1. In embodiments, additional smart contracts may also destroy tokens, such as IMPL smart contract 1320 (contract address 2), CUSTODIAN 1 smart contract 1819 (contract address 5), CUSTODIAN 2 smart contract 1350 (contract address 6), and/or CUSTODIAN 3 smart contract 1823 (contract address 7), to name a few.

In embodiments, as described above in connection with print limiter contract instructions 1360A-1 of FIG. 18C (the description of which applying herein), the second smart contract instructions may also include: (8) token balance modification instructions of token balance modification instructions module 1847 to modify a total number of tokens of the digital asset token assigned to a third designated address.

In step S2110, third smart contract instructions for the digital asset token associated with a third contract address associated with the blockchain associated with the underlying digital asset are provided. In embodiments, the third smart contract address is CUSTODIAN 2 smart contract 1350 (contract address 6) and the second smart contract instructions are the custodian 2 contract instructions 1350A-1, both described in connection with FIG. 18D. The third smart contract instructions may be saved in the blockchain 1807 and, as described in connection with the custodian 2 smart contract instructions 1350A-1 of FIG. 18D (the descriptions of which applying herein), include: (1) fourth authorization instructions and (2) fifth authorization instructions. The fourth authorization instructions of CUSTODIAN 2 first authorization instructions module 1849 (i.e., fourth authorization instructions module) may include instructions for the second designated key pair to authorize the issuance of instructions to the second smart contract instructions with respect to token creation. In embodiments, the authorization instructions with respect to token creation may be above the first threshold during the first time period.

In embodiments, a token creation request may exceed a ceiling (i.e., a request for 150 tokens when the ceiling is 100 tokens), CUSTODIAN 2 smart contract 1350 may authorize an increase in the ceiling. This authorization may be fifth authorization instructions of the CUSTODIAN 2 second authorization instructions module 1851 (i.e., fifth authorization instructions module), and may include instructions for the second designated key pair (off-line keyset 1803, . . . 1803N) to authorize the issuance of instructions to the first smart contract instructions to change the one or more designated contract address from the second contract address to a different designated contract address. In embodiments, a ceiling is raised by creating a second print limiter smart contract on the blockchain 1807 with a higher ceiling. Once the second print limiter smart contract is created, the request for token creation can be routed to the second print limiter smart contract.

A more detailed description of the process of raising the token creation ceiling is located above in connection with FIGS. 19A-B, the description of which applying herein.

The process of FIG. 21A may continue with step S2112. At step 2112, fourth smart contract instructions are provided for the digital asset token associated with a fourth contract address associated with the blockchain associated with the underlying digital asset. In embodiments, the fourth contract address is STORE smart contract 1330 (contract address 4) and fourth smart contract instructions of step S2112 are the store contract instructions 1330A-1, both described in connection with FIG. 18E. The fourth smart contract instructions may include: (1) storage instructions and (2) sixth authorization instructions. In embodiments, storage instructions of storage instructions module 1853 may include instructions for transaction data related to the digital asset token to be stored. The transaction data may include (for all issued tokens of the digital asset token): (1) public address information associated with the underlying digital asset; and (2) corresponding token balance information associated with said public address information. In embodiments, sixth authorization instructions of authorization instructions module 1855 may include instructions for modifying the transaction data in response to request from the second contract address (print limiter 1813).

At a step S2114, fifth smart contract instructions are provided for the digital asset token associated with a fifth contract address associated with the blockchain associated with the underlying digital asset. In embodiments, the fifth smart contract address is IMPL smart contract 1320 (contract address 2) and the fifth smart contract instructions are impl contract instructions 1320A-1.

Figure 21B:
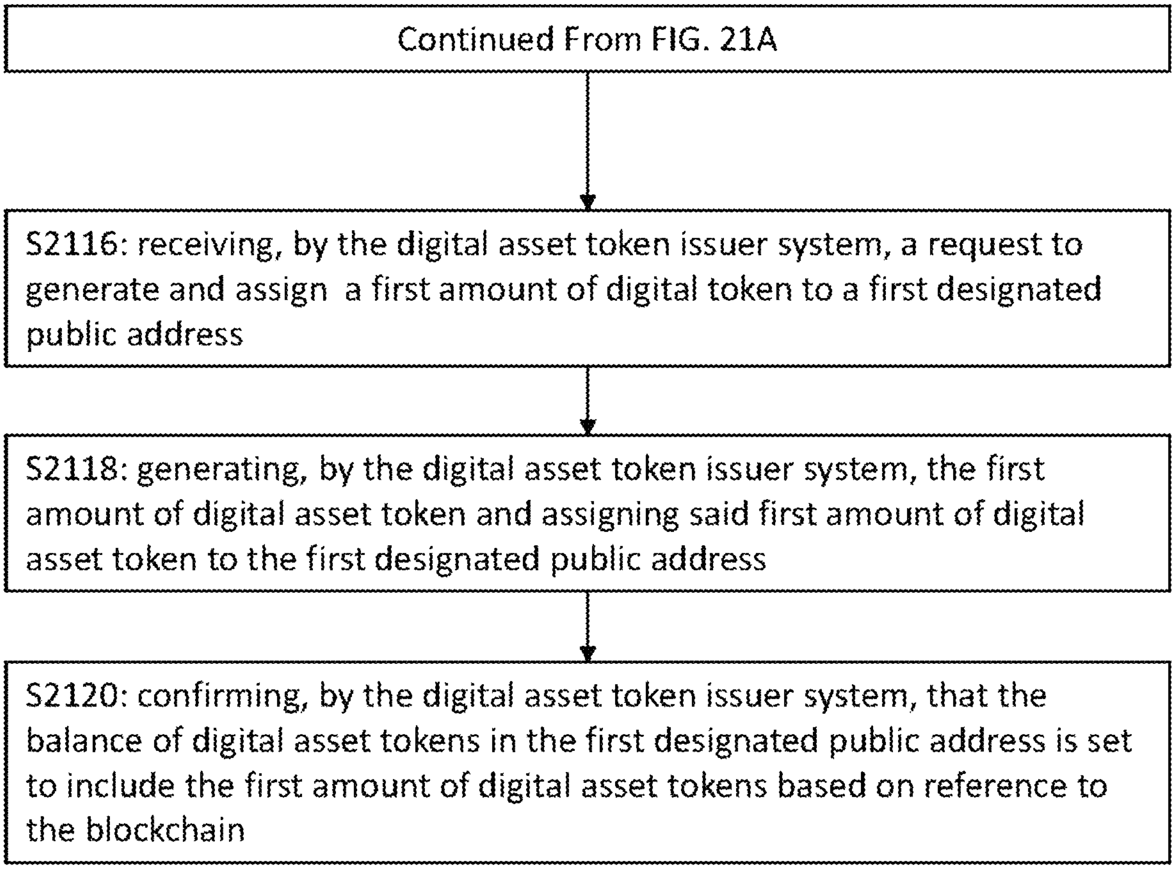
FIG. 21B is a flowchart of an exemplary process of increasing the total supply of tokens of a digital asset token in accordance with exemplary embodiments of the present invention.

The process of FIG. 21A may continue with step S2116 of FIG. 21B. At step S2116, a request to generate and assign a first amount of digital token to a first designated public address is received by the digital asset token issuer system. In embodiments, the fist designated public address may be User 1 public address 1827, User 1 public address 1827 being associated with User 1 Device 1805. In embodiments, a validation request may be sent to the on-line key public address 1 1825. The validation request may determine whether the first amount of digital token is available to be generated and assigned. In embodiments, the digital asset token issuer system may determine whether the on-line key has the authority to process the request to generate and assign the first amount of digital token. This determination may be made based on a variety of factors, including whether the first amount of digital token is actually available and/or the ceiling of digital asset tokens for a specific time period, to name a few.

At step, S2118, the digital asset token issuer system generates the first amount of digital asset token and assigns the first amount of digital asset tokens to the first designated public address. In embodiments, step S2118 may include the digital asset token issuer system generating a first transaction request. The first transaction request, in embodiments, may be address from the online public key address (On-line public address 1 1825) to the fifth contract address (IMPL Smart Contract (Contract Address 2) 1320). The first transaction request may include a first message including a first request to generate the first amount of digital asset token and assign said first amount of digital asset token to the first designated public address. In embodiments, the first transaction request is digitally signed by the first on-line private key (on-line keyset 1362). After the transaction request is generated, the first transaction request may be sent from the online public key address (On-line public address 1 1825) to the fifth contract address (IMPL smart contract 1320 (contract address 2)). In embodiments, the first transaction request includes first transaction fee information for miners in the blockchain network to process the first transaction request.

After the first transaction request is received by the fifth contract address, in embodiments, the fifth smart contract (IMPL 1320) may execute, via the blockchain 1807, the first transaction request to validate the first request and the authority of the first on-line private key (on-line keyset 1 1362) to call the second smart contract (print limiter 1813) to execute the first transaction request. The second smart contract (print limiter 1360) may also send a first call request to the fifth contract address (IMPL smart contract 1320 (contract address 2)) to generate and assign to the first designated public address (user 1 public address 1827) the first amount of digital asset tokens.

In response to the return call, in embodiments, the fifth smart contract (IMPL smart contract 1320) may execute via the blockchain 1807 the first call request to generate a first unique lock identifier. The fifth smart contract (IMPL smart contract 1320) may return to the second smart contract address (print limiter 1813) the first unique lock identifier.

In embodiments, in response to the return of the first unique lock identifier, the second smart contract (print limiter 1360) may execute, via the blockchain 1807, a second call request to the fifth smart contract address (IMPL smart contract 1320 (contract address 2)) to confirm the first call request with the first lock identifier.

In response to the second call request, in embodiments, the fifth smart contract (IMPL smart contract 1320) executes, via the blockchain 1807, the pending first call request to execute a third call request to the fourth contract address (STORE smart contract 1330 (contract address 4)) to obtain the total supply of digital asset tokens in circulation.

In embodiments, the fifth smart contract (IMPL 1320) executes, via the blockchain network 1807, the call to execute the first call to execute a second call to the fourth smart contract (STORE smart contract 1330) to obtain the total supply of digital asset tokens in circulation. After executing the third call request, the fourth smart contract (STORE smart contract 1330) returns, to the fifth contract address (IMPL smart contract 1320 (contract address 2)), a second amount of digital asset tokens corresponding to the total supply of digital asset tokens in circulation.

In response to the return of the second amount, in embodiments, the fifth smart contract (IMPL smart contract 1320 (contract address 2)) executes via the blockchain 1807 a fourth call request to the fourth contract address (STORE smart contract 1330 (contract address 4)) to set a new total supply of digital asset tokens in circulation to a third amount. The third amount, in embodiments, may be the total of the first amount and the second amount.

In embodiments, in response to the fourth call request, the fourth smart contract (STORE smart contract 1330) executes via the blockchain 1807 the fourth call request and sets a new total supply of digital asset tokens in circulation at the third amount. Once the total supply is set to the third amount, the fourth smart contract (STORE smart contract 1330) returns to the fifth contract address (IMPL smart contract 1320 (contract address 2)).

The fifth smart contract executes, in embodiments, in response to the return, via the blockchain 1807, a fifth call request to the fourth contract address (STORE smart contract 1330 (contract address 4)) to add the first amount of digital asset tokens to the balance associated with the first designated public address.

In embodiments, in response to the fifth call request, the fourth smart contract (STORE smart contract 1330) executes, via the blockchain 1807, the fifth call request to set the balance of digital asset tokens in the first designated public address (user 1 public address 1827) at a fourth amount which includes the addition of the first amount to the previous balance.

In embodiments, the fourth smart contract (STORE smart contract 1330) returns to the fifth contract address (IMPL smart contract 1320 (contract address 2)). Once the fifth contract address receives the return, in embodiments, the fifth contract address returns to the second contract address (PRINT LIMITER smart contract 1360 (contract address 3)).

The process of FIGS. 21A-B may continue with step S2120. At step S2120, the digital asset token issuer system confirms the balance of digital asset tokens in the first designated public address (user 1 public address 1827) is set to include the first mount of digital asset tokens based on reference to the blockchain.

In embodiments, the steps of FIGS. 21A and 21B may be rearranged and/or omitted.

Example 2

Increase the Token Supply by 10 Million Cents Using an _Online_Key (Assumes the Amount to be Printed would not Exceed the Ceiling Limit)

address (contract address 1 (proxy smart contract) 1809). In embodiments, the second transaction request may include a second message including a second request to transfer a fifth amount of digital assets from the first designated public address to a second designated public address. The second transaction request may be digitally signed by a first user private key. In embodiments, the first user private key may be mathematically related to first designated public address (user 1 public address 1827). In embodiments, the first user device 1805 has access to the first user private key prior to sending the second transaction request. In embodiments, the second transaction request includes second transaction fee information for miners in the blockchain network to process the second transaction request.

Figure 19D:
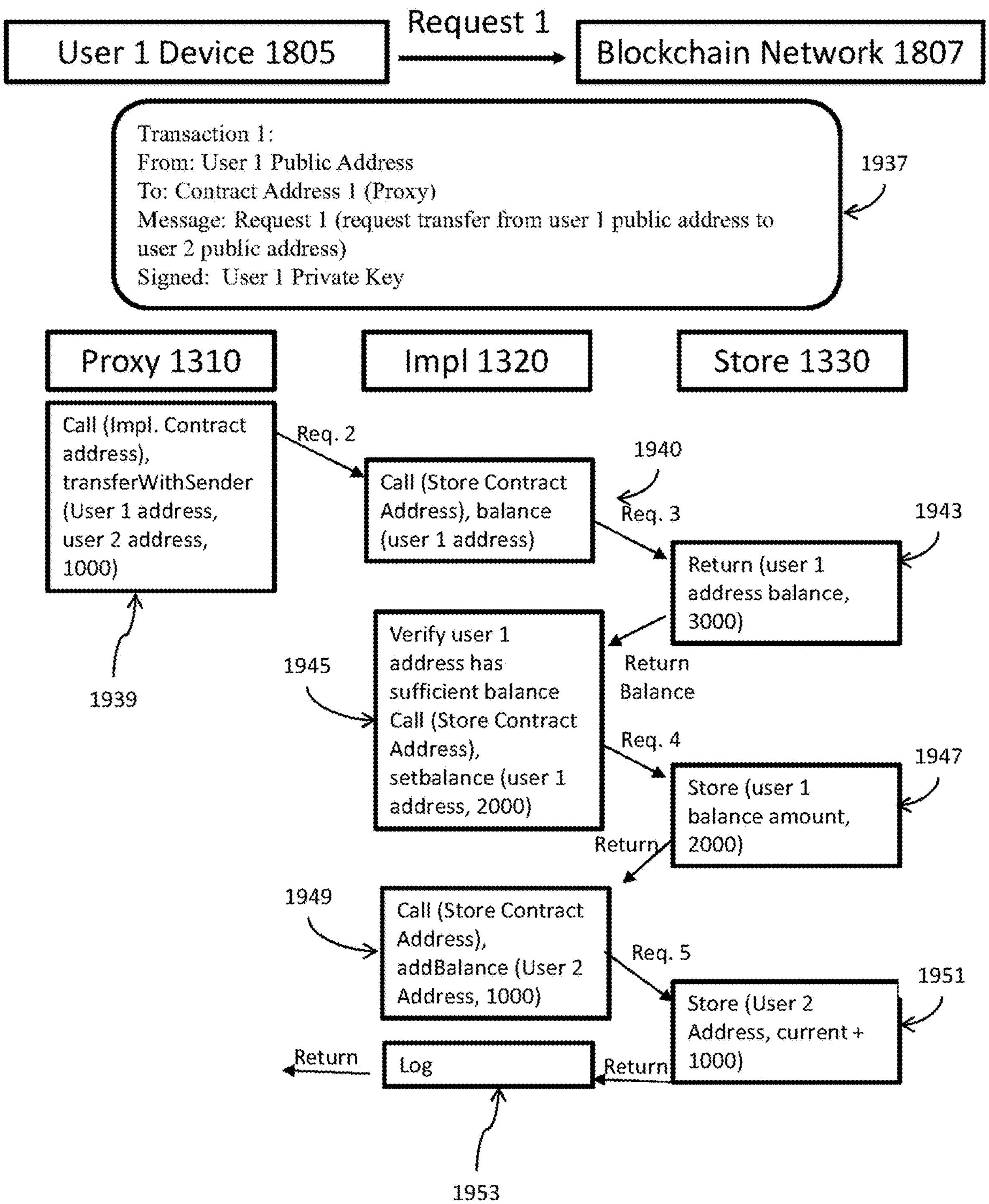
FIG. 19D is a schematic drawing of an exemplary process of a transfer request in accordance with exemplary embodiments of the present invention.

Once the second transaction request is sent, the first smart contract address (contract address 1 (proxy smart contract) 1809) executes, via the blockchain 1807, the second transaction request to execute 1939, via the blockchain 107 a sixth call request to the fifth contract address (IMPL smart contract 1320 (contract address 2)) to transfer a fifth amount of digital assets from the first designated public address (User 1 public address 1827) to the second designated public address (User X public address 1827X). As shown in FIG. 19D, the proxy smart contract 1310 calls the IMPL smart contract 1320 to perform a function—transferWithSender (user 1 address, user 2 address, 1000).

In response to the sixth call request, the fifth smart contract (IMPL smart contract 1320 (contract address 2)) executes, via the blockchain 1807, authorization instructions to verify the sixth call came from an authorized contract

```
Tx 1.
TO = address of PrintLimiter
DATA = 'limitedPrint(address of User 1, 10,000,000)'
(Tx signed by Administrator... analogous to above)
Execution validates that the new supply including 10 million cents would not exceed the ceiling.
Next,
CALL '(address of Impl.) requestPrint(address of User 1, 10,000,000)'
Execution continues in Impl. in function 'requestPrint'.
This function produces a unique lock identifier, say 'lockId2'.
Execution returns from Impl. to PrintLimiter, passing 'lockId2'.
Next, in PrintLimiter
CALL '(address of Impl).confirmPrint(lockId2)'.
Execution continues in Impl. in function 'confirmPrint'.
The pending print associated with 'lockId2' (address of User 1, 10,000,000) is retrieved.
Next,
CALL '(address of Store).totalSupply( )' (Execution continues in Store, in function total Supply,
which returns with the value of the total supply)
let new supply = current supply + 10,000,000
Next,
CALL '(address of Store).setTotalSupply(new supply)'
Execution continues in Store in function 'setTotalSupply'.
STORE total supply = new supply
Execution returns to Impl.
Next,
CALL '(address of Store).addBalance(address of User 1, 10,000,000)'
Execution continues in Store in function 'addBalance',
STORE balance of User 1 = balance of User 1 + 10,000,000
Execution returns to Impl. (some logging occurs, but let's skip over this)
Execution returns to PrintLimiter and terminates.
```

In embodiments, the process of FIGS. 21A-B may further include the process described in connection with FIG. 19D. The process starts with the blockchain 1807 receiving, from a first user device associated with the first designated public address via the blockchain, a second transaction request 1937. The first user device, may be user device 1 1805. The first designated public address may be user 1 public address 1827. The second transaction request may be addressed from the first designated public address to the first contract address, and, upon verification, executes a seventh call request 1941 to the fourth contract address (STORE smart contract 1330 (contract address 4)) to obtain a sixth amount of digital asset tokens which reflect a current balance of digital asset tokens associated with the first designated public address. As shown in FIG. 19D, the IMPL smart contract 1320 calls the STORE smart contract 1330 to determine the balance associated with the user 1 public address.

In response to receiving the seventh call request, the fourth smart contract address (STORE smart contract 1330 (contract address 4)) executes 1943, via the blockchain 1807, the seventh call request to return the sixth amount of digital asset tokens. As shown in FIG. 19D, the store smart contract returns the balance associated with the user 1 address, which, in the case of the example shown in connection with FIG. 19D, is 3000.

In response to the return of the sixth amount of digital asset, the fifth smart contract (IMPL smart contract 1320 (contract address 2)) executes 1945, via the blockchain 1807, a balance verification instruction to confirm that the fifth amount of digital asset tokens is less than or equal to the sixth amount of digital asset tokens. In the case where the fifth amount of digital asset tokens is less than or equal to the sixth amount of digital asset tokens, the fifth smart contract executes, via the blockchain network 1807, a seventh call request to the fourth contract address (STORE smart contract 1330 (contract address 4)) to set a new balance for the digital asset tokens in the first designated public address to a seventh amount which equals the sixth amount less the fifth amount. As shown in FIG. 19D, the IMPL smart contract 1320 verifies that user 1 has a sufficient balance. The user balance in this example is 3000. The transfer request is for 1000. Thus, user 1 has a sufficient balance to transfer. Once verified, the IMPL smart contract 1320 sets the user 1 balance at 2000 (the original user balance 3000 less the transfer request amount 1000).

In response to the seventh call, the fourth smart contract (STORE smart contract 1330) executes 1947, via the blockchain 1807, the seventh call to set and store the new balance for the first designated public address as the seventh amount the second designated public address (User X public address 1827X) at a seventh amount which includes the addition of the second amount to a previous balance associated with the second designated public address. As shown in FIG. 19D, the IMPL smart contract 1320 calls the store smart contract to add the transfer amount (1000) to the balance associated with the second user address.

In response to receiving the either call, the store smart contract executes the eighth call and sets the balance associated with the second user to the balance before the transfer and the transfer amount 1951.

In embodiments, the STORE smart contract 1330 returns to the IMPL smart contract 1320. In response to the return, the IMPL smart contract 1320 may log the new balance associated with the second user 1953. In embodiments, the IMPL smart contract 1320 may then return to the proxy smart contract 1310.

In embodiments, once the transfer has been completed, the first user device (user 1 device 1805) may confirm that the balance of digital asset tokens in the first designated public address is the sixth amount of digital asset tokens based on reference to the blockchain 1807. Similarly, the second user device (user X device 1805X) may also confirm that the balance of digital asset tokens in the second designated public address is the seventh amount of digital asset tokens based on reference to the blockchain 1807.

Example 3

User 1 Transfers 1,000 Cents to User 2

```
Tx 1.
TO = address of Proxy
DATA = 'transfer(address of User 2, 1,000)'
Tx signed by User 1 private key, therefore FROM = address of User 1 public key
Execution immediately jumps to Impl.
CALL '(address of Impl.).transferWithSender(address of User 1, address of User 2, 1,000)'
Execution continues in Impl. in function 'transferWithSender'.
This function validates that it was called by the sender it trusts, so it checks that sender is address
of Proxy.
Next,
CALL '(address of Store).balances(address of User 1)' (Execution continues in Store, in function
'balances', which returns the balance associated with the address of User 1)
Execution returns and continues in Impl where the retrieved balance value is compared to 1,000
to check that User 1 has at least 1,000 tokens.
let new balance of User 1 = balance of User 1 - 1,000
Next,
CALL '(address of Store).setBalance(address of User 1, new balance of User 1)'
Execution continues in Store in function 'setBalance'. (function checks that it was called by the
sender it trusts, the active Impl.)
STORE balance of User 1 = new balance of User 1
Execution returns to Impl.
Next,
CALL '(address of Store).addBalance(address of User 2, 1,000)'
Execution continues in Store in function 'addBalance'. (function checks that it was called by the
sender it trusts... )
STORE balance of User 2 = balance of User 2 + 1,000
Execution returns to Impl. (some logging occurs, but let's skip over this)
Execution returns to Proxy and terminates.
```

and returns the new balance for the first designated public address as the seventh amount. As shown in FIG. 19D, the store smart contract sets the user 1 balance as the seventh amount (2000).

Figure 19E:
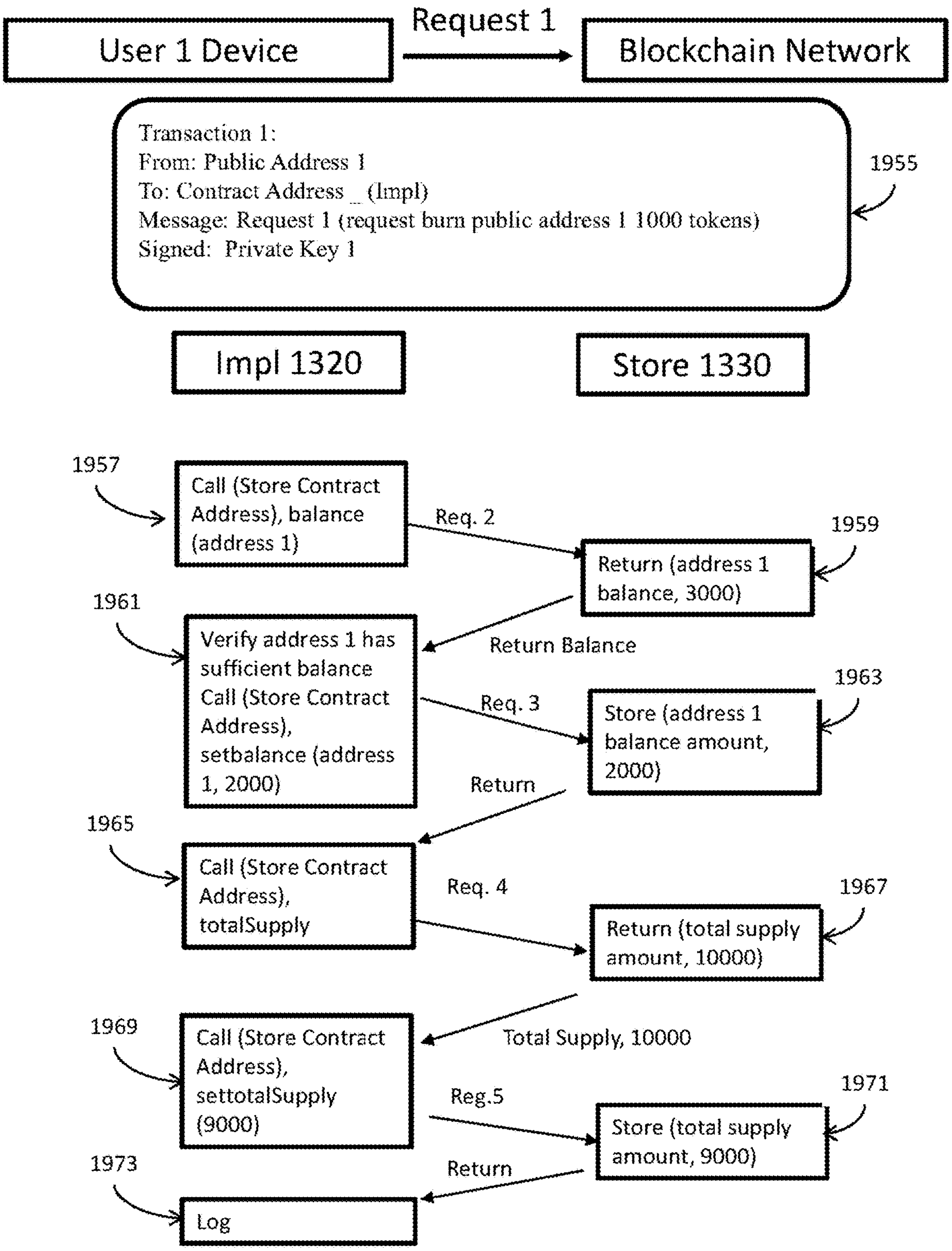
FIG. 19E is a schematic drawing of an exemplary process of a burn request in accordance with exemplary embodiments of the present invention.

In response to the return of the new balance, the fifth smart contract (IMPL smart contract 1320) executes 1949, via the blockchain 1807, an eighth call to add the second amount of digital asset tokens to the balance associated with In embodiments, the process of FIGS. 21A-B may further include the process described in connection with FIG. 19E. In embodiments, the process may begin with providing a third designated key pair. The third designated key pair, in embodiments, may include a third designated public key of the underlying digital asset and a corresponding third designated private key. The third designated private key may be stored on a third computer system which is connected to the distributed public transaction ledger through the internet (network 15). In embodiments, the third designated key pair may be the first designated key pair. In embodiments, the third designated key pair may be the second designated key pair. In embodiments, the third computer system may be the first computer system. In embodiments, the third computer system is not the first computer system. In embodiments, the administrator system 1801 includes the first computer system and the third computer system.

The blockchain 1807 may receive a second transaction request 1955 by the blockchain 1807 from the third computer system (i.e., user device 1). The second transaction request may include a second message including a second request to burn a fifth amount of digital asset tokens from a balance associated with the third designated public key address. The second transaction request may be sent from the third designated public key address to the fifth contract address (IMPL smart contract 1320 (contract address 2)). The second transaction request, in embodiments, is digitally signed by a third designated private key.

In response to receiving the second transaction request, the fifth smart contract (IMPL smart contract 1320) executes 1957, via the blockchain 1807, the second transaction request to execute, via the blockchain 1807, a sixth call request to the fourth contract address (STORE smart contract 1330 (contract address 4)) to obtain a sixth amount of digital asset tokens which reflect a current balance of digital asset tokens associated with the third designated public key address. As shown in FIG. 19E, the IMPL smart contract 1320 calls the store contract address 1815 to request a balance of digital asset tokens associated with the third designated public address (address 1).

In response to the sixth call request, the fourth smart contract (STORE smart contract 1330), executes 1959 via the blockchain 1807, the seventh call request to return the sixth amount of digital asset tokens. As shown in FIG. 19E, the STORE smart contract 1330 determines that the balance associated with the third designated public address is 3000. The STORE smart contract 1330 returns the amount (3000) to the IMPL smart contract 1320.

In response to the return of the sixth amount of digital asset, the fifth smart contract (IMPL smart contract 1320) executes 1961, via the blockchain 1807, a balance verification instruction to confirm that the fifth amount of digital asset tokens is less than or equal to the sixth amount of digital asset tokens. In the case where the fifth amount of digital asset tokens is less than or equal to the sixth amount of digital asset tokens, the fifth smart contract (IMPL smart contract 1320) executes, via the blockchain 1807, a seventh call request to the fourth contract address (STORE smart contract 1330 (contract address 4)) to set a new balance for the digital asset tokens in the third designated public key address to a seventh amount which equals the sixth amount less the fifth amount. As shown in FIG. 19E, the IMPL smart contract 1320 verifies that the third designated public address (address 1) has a sufficient balance because 1000 is less than the current balance of 3000. The IMPL smart contract 1320 then executes a call to set the balance of associated with the third designated public address (address 1) to 2000 (3000 less 1000 equals 2000).

In response to the seventh call, the fourth smart contract (STORE smart contract 1330) executes 1963, via the blockchain 1807, the seventh call to set and store the new balance for the third designated public key address as the seventh amount and returns the new balance for the third designated public key address as the seventh amount. As shown in FIG. 19E, the STORE smart contract 1330 stores the new balance as 2000 and returns to the IMPL smart contract 1320.

In response to the return of the new balance, the fifth smart contract (IMPL smart contract 1320) executes 1965, via the blockchain 1807, an eighth call request to the fourth contract address (STORE smart contract 1330 (contract address 4)) to obtain a total supply of digital asset tokens in circulation. As shown in FIG. 19E, the IMPL smart contract 1320 calls the STORE smart contract 1330, requesting a total supply of digital asset tokens.

In response to the eighth call request, the fourth smart contract (STORE smart contract 1330) executes 1967, via the blockchain 1807 the eight call request and returns, to the fifth contract address (IMPL smart contract 1320 (contract address 2)), an eighth amount of digital asset tokens corresponding to the total supply of digital asset tokens in circulation. As shown in FIG. 19E, the STORE smart contract 1330 determines that the total supply of tokens is 10,000 and returns that value to the IMPL smart contract 1320.

In response to the return of the eighth amount, the fifth smart contract (IMPL smart contract 1320) executes 1969, via the blockchain, a ninth call request to the fourth contract address (STORE smart contract 1330 (contract address 4)) to set a new total supply of digital asset tokens in circulation to a ninth amount, which is the eighth amount less the fifth amount. As shown in FIG. 19E, the IMPL smart contract 1320 calls the STORE smart contract 1330 to set the total supply of the digital asset tokens to 9,000 (10,000 less 1,000).

In response to the ninth call request, the fourth smart contract (STORE smart contract 1330) executes 1971, via the blockchain 1807, the ninth call request and sets a new total supply of digital asset tokens in circulation at the ninth amount and returns to the fifth contract address (IMPL smart contract 1320 (contract address 2)). In embodiments, the token balance modification instructions module 1847 balances the deposits and withdrawals at a predetermined time (i.e., end of the day or close of business).

In response to receiving a return from the STORE smart contract 1330, the IMPL smart contract 1320 logs 1973 the new total supply of digital asset tokens in circulation.

Example 4

Reduce the Token Supply by 1,000,000 Cents

Tx 1.

TO = address of Impl.

DATA = 'burn(1,000,000)'

(Tx is signed by the key of the address that is going to sacrifice some of its balance.)

let address of sender = address of key that signed Tx 1.

Execution immediately jumps to Store

CALL '(address of Store).balances(address of sender)' (Execution continues in Store, in function 'balances', which returns the balance associated with the sender)

-continued

```
Execution returns and continues in Impl where the retrieved balance value is compared to the
burn amount of 1,000,000 to check that the sender has at least 1,000,000 tokens.
let new balance of sender = balance of sender - 1,000,000
Next,
CALL '(address of Store).setBalance(address of sender, new balance of sender)'
Execution continues in Store in function 'setBalance'. (function checks that it was called by the
sender it trusts, the active Impl.)
STORE balance of sender = new balance of sender
Execution returns to Impl.
Next,
Call '(address of Store).totalSupply( )' (Execution continues in Store, in function
'totalSupply', which returns with the value of the total supply)
let new supply = current supply + 1,000,000
Next,
CALL '(address of Store).setTotalSupply(new supply)'
Execution continues in Store in function 'setTotalSupply'.
STORE total supply = new supply
Execution returns to Impl. (some logging occurs, but let's skip over this) And execution
terminates.
```

Example 5

Change the Impl that Proxy Delegates to

```
Tx 1.
TO = address of Proxy
DATA = 'requestImplChange( address of Impl_V2)'
(Tx would be signed by Adminstrator's 'primary' key, although there are no restrictions on who
can call this function.)
Execution produces a unique lock identifier, say 'lockId3'.
```

```
Tx 2.
TO = address of (Upgrade)Custodian (instance of the Custodian contract, with cryo tier keys,
intended to be the offline custodian of upgrade operations)
DATA = 'requestUnlock(lockId3, address of Proxy, selector for function confirmImplChange,
...and a detail I'm going to omit... )'
(Tx would be signed by Adminstrator's 'primary' key, although there are no restrictions on who
can call this function. If it's not the primary key there is an anti-spam mechanism.)
Execution produces a unique request hash, say 'reqMsgHash2'.
2 of the offline keys set up with (Upgrade)Custodian sign 'reqMsgHash2', we'll name the
signatures 'sig2_a' and 'sig2_b'.
Tx 3.
TO = address of (Upgrade)Custodian
DATA = 'completeUnlock(requestMsgHash2, sig2_a, sig2_b)'
(Tx would be signed by Adminstrator's 'primary' key, although there are no restrictions on who
can call this function.)
Execution validates the signatures (and enforces other details around time locks and revocation).
Next, it executes a call to Proxy and its confirmImplChange (NOTE that those two detailed were
fixed in Tx2 as parameters to the call to requestUnlock).
CALL '(address of Proxy).confirmImplChange(lockId3)'
Execution continues in PrintLimiter in the function 'confirmImplChange'.
Storage for the active implementation address is updated:
STORE impl = address of Impl_V2
(some logging occurs, but let's skip over this)
Execution returns to (Upgrade)Custodian
(some logging occurs, but let's skip over this)
Execution terminates.
```

FIG. 19C is a schematic drawing of an exemplary process of limiting the print limiter with respect to a public address in accordance with exemplary embodiments of the present invention. The process at FIG. 19C may begin with a first transaction request 1917 by an administrator system 1801 to blockchain 1807. The first transaction request may be from on-line key public address 1825 to PRINT LIMITER smart contract 1360 (contract address 3). In embodiments, the first transaction request may include a message requesting the limited print of 10 million digital asset tokens to user 1 public address 1827.

In response to receiving the first transaction request, the PRINT LIMITER smart contract 1360 executes 1919 a first call request, via the blockchain 1807, to the impl smart contract address 1811 to print 10 million digital asset tokens to user 1 public address 1827. In response to receiving the first call request, the impl returns a lockID 1921 to the print limiter smart contract address 1813.

In response to receiving the lockID, the print limiter smart contract executes 1923 a second call request, via the blockchain 1807, to the impl smart contract address 1811 to confirm the print of 10 million digital asset tokens using the lockID.

In response to receiving the second call, the IMPL smart contract 1320 retrieves the pending request to print 10 million digital asset tokens and executes 1925, via the blockchain 1807, a third call request to the store smart contract address 1815 to determine the total supply of digital asset tokens.

In response to receiving the third call, the STORE smart contract 1330 determines 1927 the total supply of digital asset tokens to be 100 million digital asset tokens. The total supply amount determined by the STORE smart contract 1330 is then returned by the STORE smart contract 1330 to the impl smart contract address 1811.

In response to receiving the return from the store smart contract address 1815, the impl smart contract address executes 1929, via the blockchain, a fourth call request to set the total supply of digital asset tokens to 110 million, the original total supply 100 million plus the requested print amount of 10 million. The fourth call request may be sent to the store smart contract address 1815.

In response to receiving the fourth call request, the STORE smart contract 1330 sets 1931 the total supply of digital asset tokens to 110 million digital asset tokens and returns to the impl smart contract address 1811.

In response to receiving the return from the store smart contract address 1815, the impl smart contract may execute 1933 a fifth call to add the newly printed 10 million digital asset tokens to user 1 public address 1827. The call may be sent to the store smart contract address 1815.

In response to receiving the fifth call to add the 10 million digital asset tokens to user 1 public address 1827, the STORE smart contract 1330 may store 1935 a new balance associated with the user 1 public address 1827, the new balance being the original balance plus the 10 million digital asset tokens. The STORE smart contract 1330 may then return to the impl smart contract address 1811. In response to receiving the return from the STORE smart contract 1330, the impl smart contract may return to the print limiter smart contract public address 1813.

In embodiments, the steps of FIGS. 19A through 19E may be rearranged and/or omitted. In embodiments, any of the smart contracts may be provided at any of the contract addresses, for example, the fourth contract address may correspond to the IMPL smart contract while fifth contract address may correspond to the STORE smart contract. In embodiments, one or more smart contract may be combined with one of more other smart contract.

Blockchain Based Financial Instrument

In embodiments, a digital asset in the form of a token ("Security Token") may be issued to represent inventory, equity interests in a venture, real estate, rights in intellectual property such music, videos, pictures, to name a few. When used as a security, appropriate filings with a regulatory authority may be necessary to comply with local law. In the case of a security, investors may exchange flat or other digital assets (such as BITCOIN or ETHER, to name a few) in exchange for Security Tokens. Typically, Security Tokens may issue using a smart contract written on another digital asset (such as ETHER or BITCOIN, to name a few), and tracked in a separate database stored in a distributed peer to peer network in the form of a blockchain. In an example, the blockchain is the ETHEREUM Blockchain and includes all Security Tokens, the respective address associated therewith, wherein maintenance of the blockchain is controlled by contract instructions stored in the form of a smart contract at the Contract Address. In embodiments, the Secure Token database maintained on the blockchain may be viewed via ETHERscan.io. In embodiments, the Security Token ledger may be maintained as a sidechain in a separate database off chain and published periodically or aperiodically to the blockchain. Each Security Token may also be associated with a specific digital asset address on the network associated with the underlying digital asset (e.g., the ETHEREUM Network when ETHER is the underlying digital asset, or the BITCOIN network, when BITCOIN is the digital asset, to name a few). Generally, the same blockchain will be used for the SVCoin and the Security Token.

Digital Asset Accounts and Transaction Security

Digital assets may be associated with a digital asset account, which may be identified by a digital asset address. A digital asset account can comprise at least one public key and at least one private key, e.g., based on a cryptographic protocol associated with the particular digital asset system, as discussed herein. One or more digital asset accounts may be accessed and/or stored using a digital wallet, and the accounts may be accessed through the wallet using the keys corresponding to the account.

Public Keys

A digital asset account identifier and/or a digital wallet identifier may comprise a public key and/or a public address. Such a digital asset account identifier may be used to identify an account in transactions, e.g., by listing the digital asset account identifier on a decentralized electronic ledger (e.g., in association with one or more digital asset transactions), by specifying the digital asset account identifier as an origin account identifier, and/or by specifying the digital asset account identifier as a destination account identifier, to name a few. The systems and methods described herein involving public keys and/or public addresses are not intended to exclude one or the other and are instead intended generally to refer to digital asset account identifiers, as may be used for other digital math-based asset. A public key may be a key (e.g., a sequence, such as a binary sequence or an alphanumeric sequence) that can be publicly revealed while maintaining security, as the public key alone cannot decrypt or access a corresponding account. A public address may be a version of a public key. In embodiments, a public key may be generated from a private key, e.g., using a cryptographic protocol, such as the Elliptic Curve Digital Signature Algorithm ("ECDSA").

In exemplary embodiments using BITCOIN, a public key may be a 512-bit key, which may be converted to a 160-bit key using a hash, such as the SHA-256 and/or RIPEMD-160 hash algorithms. The 160-bit key may be encoded from binary to text, e.g., using Base58 encoding, to produce a public address comprising non-binary text (e.g., an alphanumeric sequence). Accordingly, in embodiments, a public address may comprise a version (e.g., a shortened yet not truncated version) of a public key, which may be derived from the public key via hashing or other encoding. In embodiments, a public address for a digital wallet may comprise human-readable strings of numbers and letters around 34 characters in length, beginning with the digit 1 or 3, as in the example of 175tWpb8K 1S7NmH4Zx6rewF9WQrcZv245 W. The matching private key may be stored in a digital wallet or mobile device and protected by a password or other techniques and/or devices for providing authentication.

In embodiments, other cryptographic algorithms may be used such as:

(1) The elliptic curve Diffie-Hellman (ECDH) key agreement scheme;

(2) The Elliptic Curve Integrated Encryption Scheme (ECIES), also known as Elliptic Curve Augmented Encryption Scheme or simply the Elliptic Curve Encryption Scheme;
(3) The Elliptic Curve Digital Signature Algorithm (ECDSA) which is based on the Digital Signature Algorithm;
(4) The deformation scheme using Harrison's p-adic Manhattan metric;
(5) The Edwards-curve Digital Signature Algorithm (EdDSA) which is based on Schnorr signature and uses twisted Edwards curves;
(6) The ECMQV key agreement scheme which is based on the MQV key agreement scheme; and
(7) The ECQV implicit certificate scheme.

In other digital asset networks, other nomenclature mechanisms may be used, such as a human-readable string of numbers and letters around 34 characters in length, beginning with the letter L for LITECOIN or M or N for NAMECOIN or around 44 characters in length, beginning with the letter P for PPCOIN, to name a few.

Private Keys

A private key in the context of a digital math-based asset, such as BITCOIN, may be a sequence such as a number that allows the digital math-based asset, e.g., BITCOIN, to be transferred or spent. In embodiments, a private key may be kept secret to help protect against unauthorized transactions. In a digital asset system, a private key may correspond to a digital asset account, which may also have a public key or other digital asset account identifier. While the public key may be derived from the private key, the reverse may not be true.

In embodiments related to the BITCOIN system, every BITCOIN public address has a matching private key, which can be saved in the digital wallet file of the account holder. The private key can be mathematically related to the BITCOIN public address and can be designed so that the BITCOIN public address can be calculated from the private key, but importantly, the same cannot be done in reverse. In the event that a transaction is sent to a BITCOIN public address and signed by a private key that does not match, such transaction will not be processed by the BITCOIN Blockchain.

A digital asset account, such as a multi-signature account, may require a plurality of private keys to access it. In embodiments, any number of private keys may be required. An account creator may specify the number of required keys (e.g., 2, 3, 5, to name a few) when generating a new account. More keys may be generated than are required to access and/or use an account. For example, 5 keys may be generated, and any combination of 3 of the 5 keys may be sufficient to access a digital asset account. Such an account setup can allow for additional storage and security options, such as backup keys and multi-signature transaction approval, as described herein.

Because a private key provides authorization to transfer or spend digital assets such as BITCOIN, security of the private key can be important. Private keys can be stored via electronic computer files, but they may also be short enough that they can be printed or otherwise written on paper or other media. An example of a utility that allows extraction of private keys from an electronic wallet file for printing purposes is PYWALLET. Other extraction utilities may also be used consistent with the present invention.

In embodiments, a private key can be made available to a program or service that allows entry or importing of private keys in order to process a transaction from an account associated with the corresponding public key. Some wallets can allow the private key to be imported without generating any transactions while other wallets or services may require that the private key be swept. When a private key is swept, a transaction is automatically broadcast so that the entire balance held by the private key is sent or transferred to another address in the wallet and/or securely controlled by the service in question.

In embodiments, using BITCOIN clients, such as BlockChain.info's My Wallet service and BITCOIN-QT, a private key may be imported without creating a sweep transaction.

In embodiments, a private key, such as for a BITCOIN account, may be a 256-bit number, which can be represented in one or more ways. For example, a private key in a hexadecimal format may be shorter than in a decimal format. For example, 256 bits in hexadecimal is 32 bytes, or 64 characters in the range 0-9 or A-F. The following is an example of a hexadecimal private key:

E9 87 3D 79 C6 D8 7D C0 FB 6A 57 78 63 33 89F4 45 32 13 30 3D A61F20 BD 67 FC 23 3A A3 32 62

In embodiments, nearly every 256-bit number is a valid private key. Specifically, any 256-bit number between 0x1 and 0xFFFF FFFF FFFF FFFF FFFF FFFF FFFF FFFE BAAE DCE6 AF48 A03B BFD2 5E8C D036 4141 is a valid private key. In embodiments, the range of valid private keys can be governed by the secp256kl ECDSA standard used by BITCOIN. Other standards may also be used.

In embodiments, a shorter form of a private key may be used, such as a base 58 Wallet Import format, which may be derived from the private key using Base58 and/or Base58Check encoding. The Wallet Import format may be shorter than the original private key and can include built-in error checking codes so that typographical errors can be automatically detected and/or corrected. For private keys associated with uncompressed public keys, the private key may be 51 characters and may start with the number 5. For example, such a private key may be in the following format:

5Kb8kLf9zgWQnogidDA76MzPL6TsZZY36hWXMss SzNydYXYB9KF

In embodiments, private keys associated with compressed public keys may be 52 characters and start with a capital L or K.

In embodiments, when a private key is imported, each private key may always correspond to exactly one BITCOIN public address. In embodiments, a utility that performs the conversion can display the matching BITCOIN public address.

The BITCOIN public address corresponding to the sample above is:

1CC3X2gu58d6wXUWMffpuzN9JAfTUWu4Kj

In embodiments, a mini private key format can be used. Not every private key or BITCOIN public address has a corresponding mini private key; they have to be generated a certain way in order to ensure a mini private key exists for an address. The mini private key is used for applications where space is critical, such as in QR codes and in physical BITCOIN. The above example has a mini key, which is:

SzavMBLoXU6kDrqtUVmffv

In embodiments, any BITCOIN sent to the designated address 1CC3X2gu58d6wXUWMffpuzN9JAfTUWu4Kj can be transferred or spent by anybody who knows the private key in any of the three formats (e.g., hexadecimal, base 58 wallet format, or mini private key). That includes BITCOIN presently at the address, as well as any BITCOIN that are ever sent to it in the future. The private key is only needed to transfer or spend the balance, not necessarily to see it. In embodiments, the BITCOIN balance of the address can be determined by anybody with the public Block Explorer at http://www.blockexplorer.com/address/1CC3X2gu58d6wXUWMffpuzN9JAfTUWu4Kj—even if without access to the private key.

In embodiments, a private key may be divided into segments, encrypted, printed, and/or stored in other formats and/or other media, as discussed herein.

In embodiments, multi-party computation (e.g., secure computation, privacy-preserving computation), may include one or more processes for two or more parties to compute a function. In embodiments, the function may be computed by each party using a unique input. In embodiments, one or more unique inputs may be private. In embodiments, one or more of the unique inputs may be generated by one or more trusted third parties. In embodiments, at least a portion of each unique input may be the same or similar, which may, in embodiments, represent an association between one or more of the parties. In embodiments, utilizing unique inputs may improve the security and/or integrity of transactions, communication, and/or storage between two or more parties. In embodiments, a multi-party computation may conceal partial information about data while simultaneously computing with said data from two or more sources and accurately produce outputs.

One or more blockchains (e.g., blockchain 6803), in embodiments, may be based on public key infrastructure (PKI). For example, a user's identity may be determined by a set of digits representing a public key. A public key, in embodiments, may be mathematically related to a private key—the two of which may be referred to as a key set. In embodiments, a public key may correspond to a public address on a blockchain network. In embodiments, a transaction published on the blockchain is valid if the transaction includes a private key associated with the originating public address (and corresponding public key). In embodiments, a message published on the blockchain may be valid if the message includes a private key associated with the originating public address.

A multi-party computation, in embodiments, may generate a public key associated with two or more parties and/or enable two or more parties to individually and/or together sign transaction requests and/or messages originating from, or addressed to a public address associated with the two or more parties. For example, the public key may be collectively derived using a multi-party computation based on individual fragments which may be separately generated by multiple, non-trusting computers. In embodiments, the multi-party computation may result in the distribution of the signature methods (e.g., a fragment used to sign transactions) such that each party's respective signature method is kept separate and/or secret from the remaining party's respective signature method. For example, the "private key" associated with the generated public key may be a collectively generated value based on fragments from each party. As such, in embodiments, multiple non-trusting computers can each conduct computation on their own unique fragments of a larger data set to collectively produce a desired common outcome without any one node knowing the details of the others' fragments.

In embodiments, an administrator (e.g., digital asset exchange 6110, digital asset exchange computer system 6102, to name a few), may be associated with one or more public keys generated by one or more multi-party computations. For example, the digital asset exchange 6110 may have generated ten (10) multi-party public keys each associated with a separate public address on the blockchain 6108. Continuing the example, each of the ten multi-party keys may have been separately generated with a multi-party computation based on a unique input from the digital asset exchange 6110 and a respective group of one or more users. Each respective group of one or more users, in embodiments, may have different users and/or overlapping users. Referring to the example, the administrator (digital asset exchange 6110 in the example), may utilize the same unique identifier for each multi-party computation. In embodiments, the administrator may utilize one or more unique identifiers as inputs to multi-party computations. In embodiments, the administrator and/or a custodian may hold the unique identifiers for one or more parties associated with a multi-party transaction. In embodiments, the unique fragments resulting from the multi-party transaction, for each party to a multi-party transaction, may be dispersed to one or more accounts associated with one or more of the following: the respective user, a custodian, the administrator (e.g., digital asset exchange 6110, digital asset exchange computer system 6102, to name a few), a party associated the respective user, and/or a combination thereof, to name a few. In embodiments, the unique fragments resulting from the multi-party transaction, for each party to a multi-party message and/or single-party message, may be dispersed to one or more accounts associated with one or more of the following: the respective user, a custodian, the administrator (e.g., digital asset exchange 6110, digital asset exchange computer system 6102, to name a few), a party associated the respective user, and/or a combination thereof, to name a few.

A multi-party computation, in embodiments, may increase the security of transactions and/or messages sent between two or more parties. In embodiments, multi-party computations may be a fast and secure transaction, as compared to the speed and/or security of transactions involving offline key-sets. For example, multi-party computations may enable custodians of digital assets to perform Regulatory Administration Platform for Insurance Data (RAPID) transactions. As another example, multi-party computations may enable custodians of digital assets to engage in Service Level Agreements. The security of transactions and/or messages, in embodiments, may be enhanced using encryption. For example, a message and/or transaction, when sent by a first user to the administrator, may be encrypted using Rivest, Shamir, & Aldeman (RSA) algorithm(s). As another example, a message and/or transaction, when published to the blockchain, may be encrypted using Twofish algorithm(s). In embodiments, messages and/or transactions sent between one or more parties and/or published to the blockchain may be encrypted in accordance with one or more of encryption algorithm(s), such as: Triple Data Encryption Standard (DES), RSA, Blowfish, Twofish, Advanced Encryption Standard (AES), and/or a combination thereof, to name a few. Further, messages and/or transactions sent between one or more parties and/or published to the blockchain may be encrypted, which may include one or more of the following techniques: character substitution, scrambling, mapping, hashing, and/or a combination thereof, to name a few. In embodiments, symmetric and or asymmetric encryption algorithms may be applied.

For example, one or more transactions and/or messages may be encrypted and/or decrypted by using and/or applying a cryptographic hash function of one or more of: the one or more messages, the one or more transactions, the public key(s) associated with the one or more messages and/or transactions, the private key(s) associated with the one or more messages and/or transactions, and/or a combination thereof, to name a few. A cryptographic hash function may be a hash function that is a mathematical algorithm which maps data of arbitrary size to a bit string of a fixed size (e.g., a hash). In embodiments, the cryptographic hash function may be designed to be a one-way function (e.g., a function that is infeasible to invert). The cryptographic hash function, may include one or more of the following prosperities: (1) deterministic such that the same message produces results in the same hash; (2) high speed, such that the hash value for a message is computed in a manner that does not slow the process down; (3) infeasible to generate a message from the hash, such that generating a message from the hash value would require attempting all possibilities (e.g., a brute force approach); and (4) unique, such that messages to not have the same hash value and/or small changes to a message alter the hash value such that the values do not correlate, to name a few.

As referred to herein, a public key may be similar to one or more of the following, the descriptions of each applying herein: the corresponding public key of the on-line key set 1364; and/or one or more of the public keys described in connection with FIGS. 14A-14G, 20A-20B, 21A-21B, 32A-32B, and/or 40A-45, to name a few, to name a few.

Digital Wallets

In embodiments, digital math-based assets can be stored and/or transferred using either a website or software, such as downloaded software. The website and/or downloadable software may comprise and/or provide access to a digital wallet. Each digital wallet can have one or more individual digital asset accounts (e.g., digital asset addresses) associated with it. Each user can have one or more digital wallets to store digital math-based assets, digital cryptocurrency, assets and the like and/or perform transactions involving those currencies or assets. In embodiments, service providers can provide services that are tied to a user's individual account.

Digital wallets and/or the digital asset accounts associated with and/or stored by a digital wallet may be accessed using the private key (which may be used in conjunction with a public key or variant thereof). Accordingly, the generation, access, use, and storage of digital asset accounts is described herein with respect to generation, access, use, and storage of digital wallets. Such descriptions are intended to be representative of digital asset accounts and not exclusive thereof.

A digital wallet can be generated using a digital asset client 110 (e.g., a BITCOIN client). In embodiments, a digital wallet can be created using a key pair system, such as an asymmetric key pair like a public key and a private key. The public key can be shared with others to designate the address of a user's individual account and/or can be used by registries and/or others to track digital math-based asset transactions involving a digital asset account associated with the digital wallet. Such transactions may be listed or otherwise identified by the digital wallet. The public key may be used to designate a recipient of a digital asset transaction. A corresponding private key can be held by the account holder in secret to access the digital wallet and perform transactions. In embodiments, a private key may be a 256-bit number, which can be represented by a 64-character hexadecimal private key and/or a 51-character base-58 private key. As discussed herein, private keys of other lengths and/or based on other numbering systems can be used, depending upon the user's desire to maintain a certain level of security and convenience. Other forms of key pairs, or security measures can be used consistent with embodiments of the present invention.

In embodiments, a digital wallet may store one or more private keys or one or more key pairs which may correspond to one or more digital asset accounts.

In embodiments, a digital wallet may be a computer software wallet, which may be installed on a computer. The user of a computer software wallet may be responsible for performing backups of the wallet, e.g., to protect against loss or destruction, particularly of the private and/or public key. In embodiments, a digital wallet may be a mobile wallet, which may operate on a mobile device (e.g., mobile phone, smart phone, cell phone, iPod Touch, PDA, tablet, portable computer, to name a few). In embodiments, a digital wallet may be a website wallet or a web wallet. A user of a web wallet may not be required to perform backups, as the web wallet may be responsible for storage of digital assets. Different wallet clients may be provided, which may offer different performance and/or features in terms of, e.g., security, backup options, connectivity to banks or digital asset exchanges, user interface, and/or speed, to name a few.

In embodiments, a digital wallet may be a custodial digital wallet. Further, the custodial digital wallet may be a segregated custodial wallet or a commingled custodial wallet. Segregated custodial digital wallets hold digital assets for the benefit of a single customer or entity. Commingled custodial accounts hold digital assets for multiple users or customers of the custodian. Segregated custodial wallets are useful for institutional clients, mutual funds and hedge funds, for example.

While many digital asset holders may hold their digital assets in their own wallets, various custodial services, like Gemini custodial services exist. In embodiments, the present invention may be used with custodial wallets. In embodiments, custodial wallets may be commingled custodial wallets which commingle digital assets from more than one client. In embodiments, custodial wallets may be segregated custodial wallets, in which digital assets for a specific client is held using one or more unique digital asset addresses maintained by the custodial service. For segregated custodial wallets, the amount of digital assets held in such wallet(s) may be verified and audited on their respective blockchain. In embodiments, segregated custodial accounts may be used for digital asset holders such as hedge funds, mutual funds, exchange traded funds, to name a few. Proof of control as described herein may be implemented to verify the amount of assets held in custodial wallets, including both segregated custodial wallets and commingled custodial wallets.

Signatures

A transaction may require, as a precondition to execution, a digital asset signature generated using a private key and associated public key for the digital asset account making the transfer. In embodiments, each transaction can be signed by a digital wallet or other storage mechanism of a user sending a transaction by utilizing a private key associated with such a digital wallet. The signature may provide authorization for the transaction to proceed, e.g., authorization to broadcast the transaction to a digital asset network and/or authorization for other users in a digital asset network to accept the transaction. A signature can be a number that proves that a signing operation took place. A signature can be mathematically generated from a hash of something to be signed, plus a private key. The signature itself can be two letters such as r and s. With the public key, a mathematical algorithm can be used on the signature to determine that it was originally produced from the hash and the private key, without needing to know the private key. Signatures can be either 73, 72, or 71 bytes long, to name a few.

In embodiments, the ECDSA cryptographic algorithm may be used to ensure that digital asset transactions (e.g., BITCOIN transactions) can only be initiated from the digital wallet holding the digital assets (e.g., BITCOIN). Alternatively, or in addition, other algorithms may be employed.

In embodiments, a transaction from a multi-signature account may require digital asset signatures from a plurality of private keys, which may correspond to the same public key and/or public address identifying the multi-signature digital asset account. As described herein, a greater number of private keys may be created than is necessary to sign a transaction (e.g., 5 private keys created and only 3 required to sign a transaction). In embodiments, private keys for a multi-signature account may be distributed to a plurality of users who are required to authorize a transaction together. In embodiments, private keys for a multi-signature account may be stored as backups, e.g., in secure storage, which may be difficult to access, and may be used in the event that more readily obtainable keys are lost. As noted above, there are a variety of cryptographic algorithms that may be used.

Market Places

Figure 60:
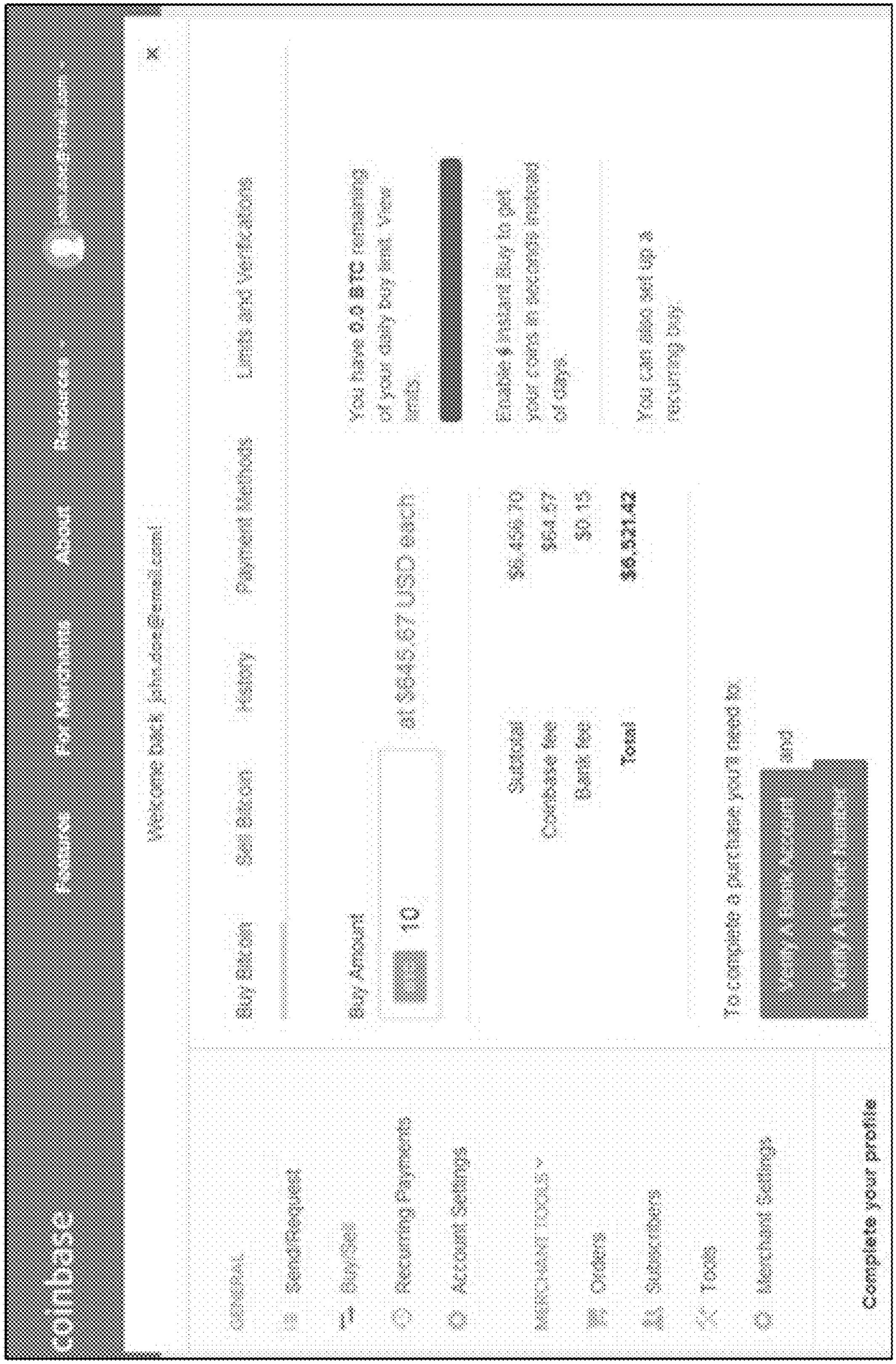
FIG. 60 is an exemplary exchange agent interface in accordance with exemplary embodiments of the present invention.

A digital asset market place, such as a BITCOIN market place, can comprise various participants, including users, vendors, exchanges, exchange agents, and/or miners/mining pools. The market contains a number of digital asset exchanges, which facilitate trade of digital assets using other currencies, such as United States dollars. Exchanges may allow market participants to buy and sell digital assets, essentially converting between digital assets (e.g., BITCOIN) and currency, legal tender, and/or traditional money (e.g., cash). In embodiments, a digital asset exchange market can include a global exchange market for the trading of digital assets, which may contain transactions on electronic exchange markets. In embodiments, a digital asset exchange market can also include regional exchange markets for the trading of digital assets, which may contain transactions on electronic exchange markets. In accordance with the present invention, exchanges and/or transmitters may also be used to facilitate other transactions involving digital assets, such as where digital assets are being transferred from differently denominated accounts or where the amount to transfer is specified in a different denomination than the digital asset being transferred, to name a few. Gemini Trust Company LLC ("Gemini") at (www.gemini.com) is an example of a digital asset exchange 130. By example, registered users of Gemini may buy and sell digital assets such as BITCOIN and ETHER in exchange for fiat such as U.S. dollars or other digital assets, such as ETHER and BITCOIN, respectively. A BITCOIN exchange agent 135 can be a service that acts as an agent for exchanges, accelerating the buying and selling of BITCOIN as well as the transfer of funds to be used in the buying and/or selling of BITCOIN. COINBASE is an example of a company that performs the role of a BITCOIN exchange agent 135. COINBASE engages in the retail sale of BITCOIN, which it obtains, at least in part, from one or more exchanges. FIG. 60 illustrates an exemplary COINBASE website interface for buying BITCOIN. Other COINBASE options include "Sell BITCOIN," "Send Money," "Request Money," and "Recurring Payments." Other options could also be made available consistent with exemplary embodiments of the present invention.

In addition to the services that facilitate digital asset transactions and exchanges with cash, digital asset transactions can occur directly between two users. In exemplary uses, one user may provide payment of a certain number of digital assets to another user. Such a transfer may occur by using digital wallets and designating the public key of the wallet to which funds are being transferred. As a result of the capability, digital assets may form the basis of business and other transactions. Digital math-based asset transactions may occur on a global scale without the added costs, complexities, time and/or other limits associated with using one or more different currencies.

Vendors 140 may accept digital assets as payment. A vendor 140 may be a seller with a digital wallet that can hold the digital asset. In embodiments, a vendor may use a custodial wallet. In embodiments, a vendor 140 may be a larger institution with an infrastructure arranged to accept and/or transact in digital assets. Various vendors 140 can offer banknotes and coins denominated in BITCOIN; what is sold is really a BITCOIN private key as part of the coin or banknote. Usually, a seal has to be broken to access the BITCOIN private key, while the receiving address remains visible on the outside so that the BITCOIN balance can be verified. In embodiments, a debit card can be tied to a BITCOIN wallet to process transactions.

Secondary Market Activities

Figure 67:
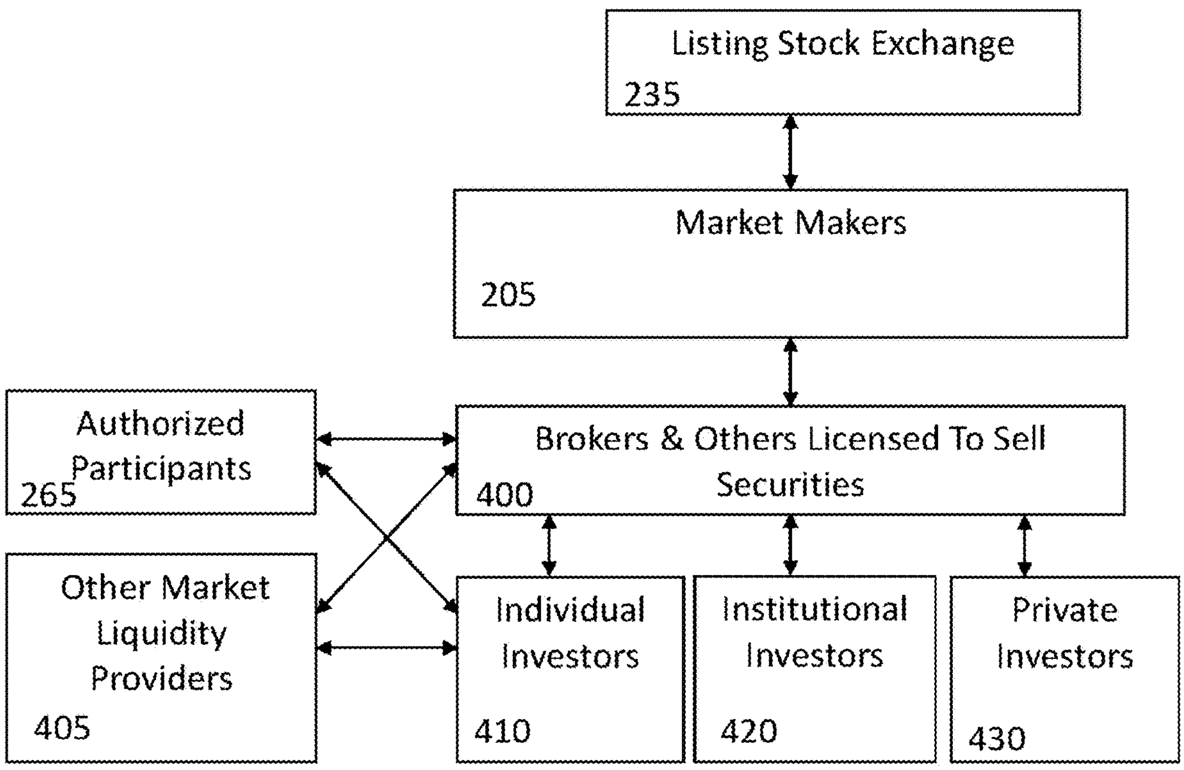
FIG. 67 is a schematic diagram of an exemplary secondary market for shares in the trust in accordance with exemplary embodiments of the present invention.

FIG. 67 is a schematic diagram of an exemplary secondary market for shares in the trust in accordance with exemplary embodiments of the present invention. In embodiments, the secondary market can include one or more listing stock exchanges 235 (e.g., NYSE, NASDAQ, AMEX, LSE, to name a few), one or more market makers 205, one or more brokers and/or other licensed to sell securities 400, authorized participants 265, other market liquidity providers 405, individual investors 410, institutional investors 420 and private investors 430, to name a few.

As described earlier, in the primary market APs 265 may obtain and/or redeem shares in the trust through the creation and redemption redeem processes. APs 265 may then sell shares in a secondary market. APs 265 may also buy shares in the secondary market. In an exemplary secondary market for shares in the trust for a digital math-based asset ETP, e.g., a BITCOIN ETP, a listing stock exchange 235 may be the primary listing venue for individual ETP shares. In embodiments, the listing stock exchange 235 may be required to file listing rules with the SEC if no applicable listing rules already exist. The listing exchange 235 may enter into a listing agreement with the sponsor 230. In embodiments, the listing exchange 235 may appoint the lead market maker and/or other market makers 205. The market makers 205 may facilitate the secondary market trading of shares in the trust underlying the ETP. Market makers 205 may facilitate creations and/or redemptions of creation units through one or more APs. In embodiments, such creations and/or redemptions may be related to market demand, e.g., to satisfy market demand.

Still referring to FIG. 67, individual investors 410, institutional investors 420, and/or private investors 430 may buy and/or sell one or more shares in the trust. In embodiments, these investors may buy and/or sell shares through brokers 400 or others licensed to sell securities. Brokers 400 and/or others licensed to sell securities may receive cash and/or other assets from investors in order to buy one or more shares in the trust. Brokers 400 and/or others licensed to sell securities may receive one or more shares from investors to sell for cash and/or other assets.

Other market liquidity providers 405 may also participate in the secondary market. In embodiments, other market liquidity providers 405 may buy and/or sell one or more shares on a list stock exchange 235. In embodiments, other market liquidity providers 405 may buy and/or sell one or more creation units through one or more APs 265. Other market liquidity providers 405 may include, by way of example, arbitragers, prop traders, "upstairs", private investors, dark pools, to name a few.

As illustrated in FIG. 103, in exemplary embodiments, an ETP may include one or more participants, such as one or more market makers 205, purchasers 210, trustees 215, custodian 220, administrator 225, sponsor 230, listing exchange 235, calculation agent 240, marketing agent 245, third-party clearing agency 250 (e.g., the DTC or NSCC), attorneys 255, accountants 260, and/or authorized participants 265, to name a few. In embodiments, one or more of these roles may be performed by the same entity (e.g., the same entity may be the custodian and the administrator). In embodiments, more than one entity may perform the same role or part of a role, such as more than one market maker may be used for the same ETP. Various combinations of entities can be used consistent with exemplary embodiments of the present invention.

In embodiments, an ETP may involve an underlying trust and one or more of the entities discussed herein. FIG. 103 provides an overview of at least some of the possible participants in an ETP. A sponsor 230 may establish the ETP, which generally may be established as a common law or statutory trust under state law. One trust may be created or multiple trusts for different ETPs may be established at one time. A single trust established as a series trust may also create multiple series for different ETPs. The sponsor 230 may have contractual rights involving the trust. The sponsor 230 may pay SEC registration fees and may provide seed capital for the trust, to name a few. Additionally, the sponsor 230 may prepare, sign, and/or file trust registration statements and/or other formation documents, periodic SEC reports, and/or registration statement updates. The sponsor 230 may create free-writing prospectuses and other promotional materials about the trust and may file such materials with the SEC, as required by government regulation. The sponsor 230 may participate in marketing activities for the trust, such as road shows. The sponsor 230 may maintain the trust's public website for viewing by the holders of the trust's securities, prospective purchasers of its shares, and/or any entity desirous of viewing the trust's public website.

An initial purchaser 210 may provide seed capital to the trust in exchange for a set number of creation units of the same value. A market maker 205 may undertake to buy or sell creation units in the trust at specified prices at all times.

A custodian 220 can safe keep the trust's assets and can engage one or more sub-custodians to do so in different locations. In embodiments, the one or more sub-custodians may comprise different entities. In embodiments, the one or more sub-custodians may comprise different aspects of the same entity or may be affiliated entities. A custodian 220 may hold copies of segmented private keys in one or more vaults.

An administrator 225 can keep books and records for the trust, conduct other ministerial duties and/or may calculate the trust's daily net asset value, daily share price, and/or other pertinent information about the trust, the trust's assets, and/or the trust shares.

The trustee 215, the custodian 220 and/or the administrator 225 may be the same person or entity, may be different operations of the same person or entity, may be different persons or entities, or may be multiple persons or entities performing the same and/or overlapping functions.

A listing exchange 235 is a venue where shares registered with the SEC may be listed and traded during business days. The listing exchange 225 can track using one or more computers and publish electronically using one or more computers an estimated intraday indicative value ("IIV") of a trust regularly, e.g., every 15 seconds. A calculation agent 240 using one or more computers may also perform daily calculations of trust assets using methods known in the art and may provide the IIV. The trustee 215 and/or the administrator 225 may also serve as the calculation agent 240 and may be the same person and/or entity, different operations of the same person and/or entity, and/or may be different persons.

A marketing agent 245 may also be engaged to provide services to the trust relating to the public marketing of its shares for sale. The marketing agent 245 may review marketing documents for regulatory compliance, e.g., rules of the Financial Industry Regulatory Authority ("FINRA") and/or relevant regulatory authority. The marketing agent may file the trust's marketing materials with FINRA and/or relevant regulatory authority.

The processes of clearance and settlement of trust shares may be performed by a clearing agency or a registered third-party entity 250, such as the Depository Trust Company ("DTC") and/or the National Securities Clearing Corporation ("NSCC"). Shares may be available only in book-entry form, meaning that individual certificates may not be issued for the trust's shares. Instead, shares may be evidenced by one or more global certificates that the trustee may issue to a clearing agency or a registered third-party entity 250, e.g., DTC. The global certificates may evidence all of the trust's shares outstanding at any time. As a result, in embodiments, shares may be only transferable through the book-entry system the third-party clearing agency 250. Shareholders may hold and/or transfer their shares directly through the third-party clearing agency 250, if they are participants in the clearing agency 250, or indirectly through entities that are participants in the clearing agency 250 (e.g., participants in DTC). Transfers may be made in accordance with standard securities industry practice.

An index provider 270 may license its intellectual property to the trust for pricing, portfolio selection, and/or other services, and may, using one or more computers, calculate and/or upkeep the index during the term of the license. In embodiments, for example, an index of digital asset values (such as BITCOIN values) or blended digital asset prices (such as blended BITCOIN prices) may be used to price the digital assets transferred to and/or from the trust and/or held by the trust. Other forms of valuation of the digital assets (such as BITCOIN) can also be used as discussed herein.

Lawyers 255 and accountants 260 may provide services to the sponsor 230 and/or the trust and/or other participants in the trust.

In embodiments, transactions with the trust may be restricted to one or more APs 265. The trust may establish requirements for becoming an AP, e.g., must be an entity of a certain size, financially or otherwise, must be a large market investor, like a broker-dealer and/or a bank, must seek and obtain formal approval from the trustee, must enter into an agreement with the trustee and/or other such requirements known in the art, to name a few. In embodiments, APs may be broker-dealers and/or banks. APs may enter into an AP agreement with the trust and/or the sponsor 230, which may include rules for the issuance and/or redemption of creation units. Depending on the nature of the trust's intended assets, an AP may be required to hold and deliver specific commodities, e.g., a digital math-based asset, directly to the trust.

In embodiments, a trustee 215 may be generally responsible for the day-to-day administration of the trust. A trustee 215 (or its designee, such as the custodian 220 and/or administrator 225) may perform one or more of the following tasks associated with the trust:

establishing and/or having established, using one or more computers, wallets for digital math-based assets (e.g., BITCOIN, NAMECOINS, LITECOINS, PPCOINS, TONAL BITCOINS, BITCOIN CASH, ZCASH, IXCOINS, DEVCOINS, FREICOINS, I0COINS, TERRACOINS, LIQUIDCOINS, BBQCOINS, BITBARS, PHENIXCOINS, RIPPLE, DOGECOINS, BARNBRIDGE, POLYGON, SOMNIUM SPACE, OCEAN PROTOCOL, SUSHISWAP, INJECTIVE, LIVEPEER, MASTERCOINS, BLACKCOINS, ETHER, NXT, BITSHARES-PTS, QUARK, PRIMECOIN, FEATHERCOIN, PEERCOIN, FACEBOOK GLOBAL COIN, STELLAR, TOP 100 TOKENS, TETHER; MAKER; CRYPTO.COM CHAIN; BASIC ATTENTION TOKEN; USD COIN, CHAINLINK; BITTORRENT; OMISEGO, HOLO; TRUEUSD; PUNDI X; ZILLIQA; ATOM, AUGUR; 0X; AURORA; PAXOS STANDARD TOKEN; HUOBI TOKEN, IOST; DENT; QUBITICA; ENJIN COIN, MAXIMINE COIN; THORECOIN; MAIDSAFECOIN; KUCOIN SHARES; CRYPTO.COM; SOLVE; STATUS; MIXIN; WALTONCHAIN; GOLEM; INSIGHT CHAIN; DAI; VESTCHAIN; AELF; WAX; DIGIXDAO; LOOM NETWORK; NASH EXCHANGE, LATOKEN; HEDGETRADE; LOOPRING; REVAIN; DECENTRALAND; ORBS; NEXT; SANTIMENT NETWORK TOKEN; POPULOUS; NEXO; CELER NETWORK; POWER LEDGER; ODEM; KYBER NETWORK; QASH; BANCOR; CLIPPER COIN, MATIC NETWORK, POLYMATH; FUNFAIR; BREAD; IOTEX, ECOREAL ESTATE; REPO; UTRUST; ARCBLOCK; BUGGYRA COIN ZERO; LAMBDA; IEXEC RLC; STASIS EURS; ENIGMA, QUARKCHAIN; STORJ; UGAS; RIF TOKEN; JAPAN CONTENT TOKEN; FANTOM; EDUCARE; FUSION; GAS; MAINFRAME; BIBOX TOKEN; CRYPTO20; EGRETIA; REN; SYNTHETIX NETWORK TOKEN, VERITASEUM; CORTEX, CINDICATOR; CIVIC, RCHAIN; TENX; KIN; DAPS TOKEN; SINGULARITYNET; QUANT; GNOSIS; INO COIN; ICONOMI; MEDIBLOC [ERC20]; 0X, AION, ALGORAND; AMP; ARCA; ARWEAVE; AUDIUS; AVALANCHE; BCB; BCC; BITCOIN SV; BLOCKSTACKS; CBAT; CDAI; CELA; CELO; CETH; CHIA; CODA; COSMOS; CWBTC; CZRK; DECRED; GAS; DFINITY; EOS; ETH 2.0; FILECOIN; HEDGETRADE; ION; KADENA; KYBER NETWORK; MOBILECION; NEAR; NERVOS; OASIS; OMISEGO; PAXG; POLKADOT; SKALE; DIEM; SOLANA; STELLAR; TEZOS; THETA; XRP; DIEM and/or DEW, to name a few.);

establishing and/or having established, using one or more computers, digital wallets for custody and other accounts to be used on behalf of participants in the trust, e.g., AP custody accounts 315, sponsor custody accounts 310, trust custody accounts 300, trust expense account 305, and/or vault accounts 320, to name a few;

transferring and/or having transferred, using one or more computers, digital math-based assets from and/or to one or more digital wallets associated with one or more digital wallets associated with one or more accounts, including AP custody accounts 315, trust custody accounts 300, trust expense accounts 305, sponsor custody account 310, and/or vault accounts 320, to name a few;

determining and/or having determined, using one or more computers, expenses and fees to be paid by the trust, including, e.g., sponsor fees, legal fees, accounting fees, extraordinary expenses fees, and/or transaction fees, to name a few;

paying and/or having paid, using one or more computers, expenses and fees to be paid by the trust, including, e.g., sponsor fees, legal fees, accounting fees, extraordinary expenses, and/or transaction fees, to name a few;

calculating or having calculated, using one or more computers, an ANAV, an ANAV per share, a NAV, and/or a NAV per share;

receiving and/or processing, using one or more computers, orders from APs to create and/or redeem creation units and/or baskets and/or coordinating the processing of such orders with a clearing agency or a registered third-party entity 250;

transferring and/or having transferred and/or facilitating transfers, using one or more computers, of digital math-based assets of the trust as needed into and/or out of custody accounts and/or vault accounts to cover redemptions and/or to pay expenses and fees to be paid by the trust, including, e.g., sponsor fees, legal fees, accounting fees, extraordinary expenses fees, and/or transaction fees, to name a few;

selling and/or arranging for sale remaining digital math-based assets of the trust at termination of the trust and/or distributing the cash proceeds to the shareholders of record;

supervising and/or arranging for the supervision of the safekeeping of the digital math-based assets deposited with the trust by APs in connection with the creation of creation units and/or baskets;

administering and/or having administered and/or maintaining and/or having maintained custody accounts on behalf of the trust, APs, the sponsor and/or others;

administering and/or having administered and/or maintaining and or having maintained and/or supervising the maintenance, upkeep and/or transfer of private key information to and/or from vaults; and/or generating and/or having generated, using one or more computers, encryption, splitting, QR coding (or other bar coding) and printing the paper tokens, to name a few.

In embodiments, an AP may provide assets to the trust in exchange for shares in the trust, and an AP may redeem shares in the trust for assets.

In embodiments, the assets can include additional assets besides digital math-based assets, such as, other commodities, currencies, futures, derivatives, and/or securities, to name a few.

In embodiments a system for determining and/or providing a blended digital math-based asset price can comprise one or more processors and one or more computer-readable media operatively connected to the one or more processors and having stored thereon instructions for carrying out the steps of: (i) determining, by a trust computer system including one or more computers, share price information based at least in part upon a first quantity of digital math-based assets held by a trust at a first point in time and a second quantity of shares in the trust at the first point in time; (ii) receiving, at the trust computer system from one or more authorized participant user devices of an authorized participant, an electronic request to purchase a third quantity of shares; (iii) determining, by the trust computer system, a fourth quantity of digital math-based assets based at least in part upon the share price information and the third quantity of shares; (iv)

obtaining, using the trust computer system, one or more destination digital asset account identifiers (e.g., one or more digital asset account addresses, and/or one or more digital asset account public keys, to name a few) corresponding to one or more destination digital asset accounts for receipt of digital math-based assets from the authorized participant; (v) transmitting, from the trust computer system to the one or more authorized participant user devices, the one or more destination digital asset account identifiers and an electronic amount indication of the fourth quantity of digital math-based assets; (vi) receiving, at the trust computer system, an electronic transfer indication of a transfer of digital math-based assets to the destination asset account; (vii) verifying, by the trust computer system using a decentralized electronic ledger maintained by a plurality of physically remote computer systems, a receipt of the fourth quantity of digital math-based assets in the one or more destination digital asset accounts; and (viii) issuing or causing to be issued, using the trust computer system, the third quantity of shares to the authorized participant.

Administration of a trust may involve the use of one or more accounts, including one or more custody accounts. In embodiments, referring to FIG. 104A, such accounts may include AP custody accounts 315, trust custody accounts 300, vault accounts 320, sponsor custody accounts 310, and/or trust expense accounts 305, to name a few.

A custody account can be a segregated account operated by the trustee on behalf of another involved with the trust, e.g., sponsor or AP, to name a few. In embodiments, a custody account may be a digital wallet, a digital asset account, and/or a BITCOIN account. In embodiments, a custody account may be created, e.g., by the trustee, for each new transaction, e.g., creation, redemption, payment of sponsor's fee, to name a few. Referring to the exemplary embodiment illustrated in FIG. 104A, a trust custody account 300 may be owned by the trust. The trust custody account 300 may be the primary holder of the trust's assets, e.g., BITCOIN. In an exemplary embodiment of the present invention, the trust custody account 300 may store public and private keys for one or more digital wallets holding the trust's digital assets, e.g., BITCOIN. In embodiments, referring to FIG. 104B, the trust custody account 300 may comprise one or more temporary digital wallets 325 and/or one or more vault accounts 320. Vault accounts 320 may be digital wallets. Vault accounts 320 may be stored in a secure manner as discussed herein. Vault accounts 320 may be used for longer-term storage of digital assets. Temporary digital wallets 325 may be hot storage, which may be accounts and/or wallets that are accessed with greater frequency than vault accounts 320 in order to, for example, perform transactions. In embodiments, the trust custody account 300 may be a segregated account, segregating the assets it holds from all other assets held by the custodial operations of the trustee. The trust custody account 300 may facilitate the acceptance of creation deposits from an AP custody account 315, the distribution of assets, e.g., BITCOIN, to an AP as part of a redemption, and/or the distribution of assets to a trust expense account 305 and/or a sponsor custody account 310. The trust expense account 305 may be owned by the trustee 215. In embodiments, a trust expense account 305 can be a segregated digital asset account, such as a segregated BITCOIN account, of the trustee 215 to which the trustee can transfer digital assets, e.g., BITCOIN, from a trust custody account 300 in order to pay expenses of the trust not assumed by the sponsor 230. A trust expense account 305 can be established with the trustee 215 by a trust agreement.

In embodiments, trust expense account 305 may be used by the trustee 215 to pay extraordinary expenses that have not been assumed by the sponsor 230. Indirect payment of such expenses may occur when assets are distributed to the trustee's trust expense account 305. The trustee 215 may then sell or otherwise transfer assets from the trust expense account in order to satisfy expenses. A sponsor custody account 310 may be used to accept payments by the trust of a sponsor's fee. In embodiments, payments may be made in digital math-based assets, such as BITCOIN. Payment of the sponsor's fee may be a periodic, e.g., monthly, event. One or more AP custody accounts 315-1 . . . 315-N may be owned by one or more APs, 265-1 . . . 265-N. AP custody account 315 may be used to receive deposits of assets from an AP for use in a creation, as detailed in FIGS. 17A and 17B and/or may be used to receive distributions of assets to an AP during a redemption, as detailed in FIG. 107A.

It should be appreciated by those of skill in the art that each of these accounts may be made up of one or more accounts, and/or one or more digital wallets.

The trustee and/or administrator and/or custodian may use one or more trust computers in performance of the processes and/or tasks described herein. A trust computer system may be located at an administrative portal. As illustrated in FIG. 105, a trust computer system may contain exchange transaction data 500, which may, for one or more transactions (e.g., each transaction), store exchange data, currency data, time data, price data, and/or volume data, to name a few. A trust computer system may contain trust account data 510, which may, for one or more accounts, store account types, public keys, correlation numbers, private keys and/or private key IDs (which may indicate the location of stored private keys and/or key segments), transaction history data, and/or account balance data, to name a few. A trust computer system may also contain expense data 520 and/or fee data 530.

Still referring to FIG. 105, a trust computer system may contain a blended digital asset price module 540, a NAV module 545, an expense module 550, a creation module 555, a redemption module 560, a fee module 565, an IIV module 570, a wallet module 575, a key parser module 580, and/or a key segment generator module 585, to name a few.

Investments Into ETP

In embodiments, the trust for the ETP can create and/or redeem shares from time to time. In some embodiments, the creation and/or redemption must be in whole baskets, e.g., a block of a fixed number of shares, e.g., 50,000 shares. The creation and/or redemption of baskets can require, respectively, the delivery to the Trust or the distribution from the Trust of the number of BITCOIN represented by the baskets being created and/or redeemed, the amount of which can be based on the combined NAV of the underlying assets relating to the number of shares included in the baskets being created and/or redeemed. In embodiments, an initial number of BITCOIN required for deposit with the Trust to create Shares can be a fixed amount per basket. In embodiments, the number of BITCOIN required to create a basket or to be delivered upon the redemption of a basket may change over time, due to, e.g., the accrual of trust's expenses, the transfer of the trust's BITCOIN to pay sponsor's fee and/or the transfer of the trust's BITCOIN to pay any trust expenses not assumed by the Sponsor, to name a few.

In embodiments, the number of whole and fractional BITCOIN in the deposit required for a basket ("Creation Basket Deposit") may be determined by dividing the number of BITCOIN held by the trust by the number of baskets outstanding, as adjusted for the number of whole and fractional BITCOIN constituting estimated accrued but unpaid fees and expenses of the trust. Fractions of a BITCOIN smaller than a Satoshi (i.e., 0.00000001 of a BITCOIN) which are included in the Creation Basket Deposit amount are disregarded in the foregoing calculation. All questions as to the composition of a Creation Basket Deposit will be conclusively determined by the Trustee. The Trustee's determination of the Creation Basket Deposit shall be final and binding on all persons interested in the Trust.

In embodiments, shares may be in the form of a security token, stocks, bonds, equities, fixed-income securities, fiat, commodities, marketable securities, and/or a combination thereof, to name a few.

In embodiments, baskets may be created and/or redeemed only by APs, such as APs who pay a transaction fee for each order to create and/or redeem Baskets and/or have the right to sell the shares included in the Baskets they create to other investors. In embodiments, the Trust may or may not issue fractional baskets.

In embodiments, a method for purchasing shares of a trust associated with an exchange traded product holding digital math-based assets may comprise receiving, at a trust computer system from an AP computer system, a request from an AP to purchase shares in the trust; providing or creating, at the trust computers system, one or more digital wallets associated with a trust custody account to hold digital math-based assets, each digital wallet have a respective public key and a respective private key; providing, from the trust computer system to the AP computer system, each respective public key; receiving, at the trust computers systems, into the one or more digital wallets a first amount of digital math-based assets, from one or more digital wallets associated with an AP; sending, from the trust computer system to a digital asset network, an asset notification to provide for the asset transfer recorded on a public transaction ledger of a digital asset network to reflect the transfer of the first amount of digital math-based assets; receiving, at the trust computer system, confirmation from the digital asset network, that the transfer is valid; and sending instructions to a third-party clearing entity to transfer a first amount of shares in the trust to the AP.

FIG. 106A is a flow chart of a process for investing in the trust in accordance with exemplary embodiments of the present invention. In embodiments, the process depicted in FIG. 106A may be performed by the trustee, the administrator, the custodian, and/or one or more computers operated by one or more of those entities or another entity. In exemplary embodiments, in step S102, a request may be received from a prospective AP to become an AP and/or to purchase shares in the trust. At this point the prospective AP may be made an AP with the trust for the ETP. In a step S104, authorization may be provided, e.g., from the trustee, to purchase shares in the trust. In embodiments, step S104 may begin a settlement process. In embodiments, the settlement process will comprise a window, e.g., a 3-day window, during which an AP may hedge its position in the market. In embodiments, the AP may obtain digital assets amounting to a creation deposit to create the creation unit. For example, the AP may purchase BITCOIN required for the creation deposit, or may otherwise have sufficient BITCOIN, e.g., stored in a digital wallet, to settle a creation unit order. In a step S106, the trustee may create one or more new digital wallets to receive assets from an AP. In a step S108, the trust may receive assets, e.g., from an AP. In embodiments, the assets may comprise one or more creation units. In embodiments, the assets may be deposited by the AP directly into an AP custody account. Where assets are not deposited directly into an AP custody account, in a step S110 the trustee may move the assets into an AP custody account. In a step S112, the trustee may transfer assets to one or more trust digital wallets. In embodiments, these digital wallets may be vault digital wallets which may be intended to hold assets for long term storage. In a step S114, the trustee may send an asset notification to provide for the asset transfer recorded on a network's transaction ledger or may otherwise update or cause to be updated the network's transaction ledger to reflect the transfer. In step S116, the trustee may transfer or direct the transfer, e.g., by a third-party clearing agency 250 (e.g., the DTC), of shares in the trust to the AP. In step S118, the trustee may delete the wallet or wallets into which the AP initially transferred the assets.

In an exemplary embodiment, the fund asset can be a digital asset. In exemplary embodiments, the digital asset can be a BITCOIN. To obtain shares in the trust, an AP may convert cash or anything of value to one or more digital assets. This conversion may be performed independently of the ETP or may be performed through an entity or system related to the ETP or may be performed through the ETP. In an exemplary embodiment, the AP obtains digital assets through an exchange. The AP may also have stored digital assets, e.g., an inventory of assets, which it may choose to deposit with the ETP. The AP may then deposit the digital assets with the ETP in exchange for one or more creation units of shares. Deposit of digital assets may occur via a public registry. The transfer of digital assets may occur as a peer-to-peer ("P2P") transaction, also known in the art as an end-user to end user transaction.

In embodiments, the AP may first place a creation order with the trustee, e.g., by transmitting the creation order to an administrative operations division of the trustee. In embodiments, as described above, shares may only be issued in creation units and/or in exchange for digital assets of predefined amounts. For example, one creation unit may consist of 50,000 shares and may be issued by the trustee in correlation with a deposit of the requisite amount of digital assets into the trust's account.

The trustee may accept the AP's creation order, which may begin a settlement period, e.g., a 3-day settlement period, during which the AP may engage in a settlement process. The settlement process may allow an AP time to hedge, with one possible goal being to avoid or limit risk. In embodiments, no-limit risk may be applicable. In embodiments, a goal of the hedging process may be to protect, e.g., from price movements, the AP's position in the digital assets being delivered to the trust.

In embodiments, the trustee, using one or more computers, may establish one or more digital wallets for each creation. In embodiments, the one or more digital wallets may comprise an AP custody account, which may receive assets deposited by an AP. In embodiments, an AP custody account may remain open throughout the process, and new digital wallets within the account may be created as needed and/or desired to fulfill orders and allow transfers. In embodiments, the trust may provide its own digital wallet system, which may include an interface and a programmed back end, or the trust may use an existing system. In embodiments, an AP may identify the public address of the digital wallet from which it will transfer assets to the trust.

At or before the close of the settlement window, the AP may instruct the trustee to transfer the required digital assets from the AP custody account for deposit into the trust. Upon such transfer from the AP to the trust, the AP may have satisfied its obligation. The trust, through a third-party clearing agency 250 (e.g., the DTC), may then issue shares in the required number of creation units to the AP.

In an exemplary embodiment, digital assets may be transferred from the AP to the trust by transferring the assets first from the AP's one or more outside digital wallets to the AP custody account's one or more digital wallets and, second, from the AP custody account's one or more digital wallets to the trust custody account's one or more digital wallets. In embodiments, both the transferor and the transferee's digital wallets may be required to report the transaction(s) to a registry or other system or entity in order for the transaction(s) to complete. In embodiments, there may be a time window within which both wallets must report the transaction(s). In embodiments, a transaction ledger will be updated to reflect the transfer(s).

FIG. 106B is a flow chart of a process for investing in the trust in accordance with exemplary embodiments of the present invention. In embodiments, the process depicted in FIG. 106B may be performed by the trustee of the trust, the administrator of the trust on behalf of the trust, the custodian, and/or one or more computers operated by one or more of those entities or another entity. In exemplary embodiments, in step S122, a trust computer system including one or more computers may determine share price information based at least in part upon a first quantity of digital math-based assets held by a trust at a first point in time and a second quantity of shares in the trust at the first point in time. In embodiments, the share price information may then be transmitted from the trust computer system to the one or more authorized participant user devices. In embodiments, the step S122 may further comprise the steps of determining, by the trust computer system, a fifth quantity of digital math-based assets held by the trust that are attributable to shareholders; determining, by the trust computer system, a sixth quantity of digital math-based assets by subtracting from the fifth quantity a seventh quantity of digital math-based assets associated with trust expenses; and dividing the sixth quantity by an eighth quantity of outstanding shares. In embodiments, the share price information, may be a quantity of digital math-based assets per share and/or per a basket of shares corresponding to a number of shares associated with one creation unit of shares. In embodiments, the basket of shares may comprise one or more quantities of shares selected from the group consisting of: 5,000 shares, 10,000 shares, 15,000 shares, 25,000 shares, 50,000 shares, and 100,000 shares.

In a step S124, the trust computer system may receive, from one or more authorized participant user devices of an authorized participant, an electronic request to purchase a third quantity of shares.

In a step S126, the trust computer system may determine a fourth quantity of digital math-based assets based at least in part upon the share price information and the third quantity of shares.

In a step S128, the trust computer system may be used to obtain one or more destination digital asset account identifiers corresponding to one or more destination digital asset accounts for receipt of digital math-based assets from the authorized participant. In embodiments, the one or more destination digital asset account identifiers may comprise one or more digital asset account addresses and/or public keys.

In a step S130, the one or more destination digital asset account identifiers and an electronic amount indication of the fourth quantity of digital math-based assets may be transmitted from the trust computer system to the one or more authorized participant user devices.

In a step S132, an electronic transfer indication of a transfer of digital math-based assets to the destination digital asset account may be received at the trust computer system. In embodiments, the electronic transfer indication may further comprise an identification of one or more origin digital asset accounts.

In a step S134, the trust computer system may verify, using a decentralized electronic ledger maintained by a plurality of physically remote computer systems, a receipt of the fourth quantity of digital math-based assets in the one or more destination digital asset accounts. In embodiments, step S134 may further comprise the steps of accessing, using the trust computer system, a plurality of updates to the decentralized electronic ledger; analyzing, using the trust computer system, each of the plurality of updates for a first confirmation of the receipt by a node in a network associated with the digital math-based asset; and determining, using the trust computer system, a final confirmation of the receipt after detecting first confirmations of the receipt in a predetermined number of the plurality of updates to the decentralized electronic ledger. In embodiments, the plurality of updates to the decentralized electronic ledger may comprise new blocks added to a BITCOIN blockchain.

In a step S136, the trust computer system may be used to issue or cause to be issued the third quantity of shares to the authorized participant.

In embodiments, the process depicted in FIG. 106B may further comprise the step of transferring, using the trust computer system, the fourth quantity of digital math-based assets into one or more digital asset accounts associated with a trust custody account. In further embodiments, the process depicted in FIG. 106B may further comprise the step of transmitting, from the trust computer system to the one or more authorized participant user devices, an electronic receipt acknowledgement indicating the receipt of the fourth quantity of digital math-based assets. In still further embodiments, the process depicted in FIG. 106B may further comprise the step of transmitting or causing to be transmitted, to the one or more authorized participant user devices, an electronic share issuance indication of the issuing of the third quantity of shares.

In embodiments a system for determining and/or providing a blended digital math-based asset price can comprise one or more processors and one or more computer-readable media operatively connected to the one or more processors and having stored thereon instructions for carrying out the steps of: (i) determining, by a trust computer system including one or more computers, share price information based at least in part upon a first quantity of digital math-based assets held by a trust at a first point in time and a second quantity of shares in the trust at the first point in time; (ii) receiving, at the trust computer system from one or more authorized participant user devices of an authorized participant, an electronic request to purchase a third quantity of shares; (iii) determining, by the trust computer system, a fourth quantity of digital math-based assets based at least in part upon the share price information and the third quantity of shares; (iv) obtaining, using the trust computer system, one or more destination digital asset account identifiers (e.g., one or more digital asset account addresses, and/or one or more digital asset account public keys, to name a few) corresponding to one or more destination digital asset accounts for receipt of digital math-based assets from the authorized participant; (v) transmitting, from the trust computer system to the one or more authorized participant user devices, the one or more destination digital asset account identifiers and an electronic amount indication of the fourth quantity of digital math-based assets; (vi) receiving, at the trust computer system, an electronic transfer indication of a transfer of digital math-based assets to the destination asset account; (vii) verifying, by the trust computer system using a decentralized electronic ledger maintained by a plurality of physically remote computer systems, a receipt of the fourth quantity of digital math-based assets in the one or more destination digital asset accounts; and (viii) issuing or causing to be issued, using the trust computer system, the third quantity of shares to the authorized participant.

Redemptions From ETP

In embodiments a method for redeeming shares in a trust associated with an exchange traded product holding digital math-based assets may comprise receiving, at a trust computer system from an AP computer system, a redemption order from an AP to redeem a first number of shares in the trust; determining, using the trust computer system, one or more trust wallets to access to satisfy the redemption order; generating, using the trust computer system, instructions to a custodian to retrieve at least one copy of each private key segment corresponding to the one or more trust wallets; sending the instructions to the custodian; reassembling, using the trust computer system, the one or more trust wallets using the at least one copy of each private key segment; transferring, using the trust computer system, from the one or more trust wallets a first number of digital math-based assets to an AP wallet associated with the AP; generating, using the trust computer system, instructions to the third-party clearing agency to cancel the first number of shares in the trust of the AP; and sending the instructions to the third-party clearing agency. In embodiments, the trustee using the trust computer system may approve the redemption order and/or send confirmation (e.g., electronically) of the order.

In embodiments, the redemption distribution from the trust may consist of a transfer to the redeeming AP's Authorized Participant Custody Account of the number of the BITCOIN held by the trust in the Trust Custody Account evidenced by the shares being redeemed. In embodiments, fractions of a BITCOIN included in the redemption distribution smaller than a Satoshi (i.e., 0.00000001 of a BITCOIN) may be disregarded. In embodiments, redemption distributions may be subject to the deduction of any applicable tax or other governmental charges that may be due.

FIG. 107A is a flow chart of a process for redeeming shares in the trust in accordance with exemplary embodiments of the present invention. In embodiments, the processes depicted in FIG. 107A may be performed by the trustee, the administrator, the custodian, and/or a trust computer system comprising one or more computers operated by one or more of those entities or another entity.

In step S202, the trust computer system may receive a request, e.g., a redemption order, from an AP computer system for an AP to redeem shares in the trust. In embodiments, the trustee using the trust computer system may approve the redemption order and/or send confirmation (e.g., electronically) of the order. In embodiments, a settlement process entailing, for example, a 3-day settlement window, may be triggered. Other durations of settlement periods may be used as convenient. In embodiments, the trust computer system may receive from the AP computer system one or more public keys associated with AP wallets and/or AP accounts to which redemption proceeds are designated by the AP to be distributed. For example, public key information may be sent electronically from the AP computer system to the trust computer system using, e.g., a digital wallet, e-mail, text message, a digital asset exchange, electronic communications, to name a few. In embodiments, the trustee may designate one or more existing trust custody wallets and/or create one or more new wallets using the trust computer system to be used as AP custody accounts. In embodiments, the trustee may determine the number of digital assets (e.g., BITCOIN) required for the redemption, e.g., by using the trust computer system to multiply the number of shares to be redeemed by the NAV value per share less any transaction fees associated with the redemption. In embodiments, depending upon the timing of the redemption, an ANAV value per share may be used in lieu of the NAV value per share. The trust may request and/or receive, e.g., through the third-party clearing agency 250 (e.g., the DTC), shares to be redeemed.

In step S204, the trust computer system may determine one or more wallets to access to satisfy the redemption. The determination as to how many and which wallets should be used to redeem assets may be based at least in part on one or more of the parameters discussed herein (see, e.g., Redemption Distribution Waterfalls Among Wallets).

In step S206, the trustee may instruct the custodian to retrieve from one or more vaults a copy of each private key segment comprising one or more private keys corresponding to the digital wallets that will be accessed to satisfy the redemption. In embodiments, special security measures may be implemented to limit the risk of one or more key segments being lost, damaged and/or stolen in transport. For example, bonded armored cars can be used to transport key segments. The timing of key segment retrieval and transport may be spaced so that only one segment is transported at a time. The timing and/or route of retrieval may also be randomized and/or varied to avoid predictability of transport of key segments from the vault to the administrative portal.

In step S208, the trustee, administrator and/or custodian using the trust computer system may use the retrieved private key segments to reassemble the private keys. In embodiments, this may be performed by decrypting the private key segments and reassembling the segments into a complete private key. In embodiments, the retrieved private key segments may be scanned using key reader 40, and decrypted (as necessary) using decryption software on the isolated computer 30 as part of the trust computer system, and combined and associated with the corresponding public key to regenerate a trust wallet.

In embodiments, as described in a step S208' in FIG. 107B, the trustee, administrator, and/or custodian using the trust computer system may decrypt the private key segments, reassemble the key segments into full keys, and/or reverse any cipher that was previously applied. In embodiments, these sub-steps of step S208' may be performed in any order which will result in a properly reassembled private key. In embodiments, they are performed in the reverse order of the steps used to secure and store the keys. In embodiments, the key segments are decrypted first, then reassembled into a complete key, then deciphered. The complete deciphered key may then be used to access and/or transact using a digital wallet.

In step S210, the trust computer system may identify and/or correlate the one or more private keys with the associated public keys to create one or more digital wallets to access the digital assets. In embodiments, preassembled wallets may be generated on one or more isolated transaction computers 32 to hold public key and private key information and transfer instructions awaiting closing. In embodiments, the use of preassembled wallets may expedite the wallet generation process associated with digital math based assets. In embodiments, the trust computer system may include one or more digital asset miners (e.g., BITCOIN miners) to allow for prompt transfer of ledger information to reassembled digital wallets. In embodiments, digital math-based assets earned by the digital asset miners may be added to the trust and/or paid to the administrator and/or sponsor as a fee.

In step S212, the trust computer system may reassemble, regenerate, or otherwise access the one or more trust custody account digital wallets (which may, in embodiments, be vault wallets) using the private and/or public keys. The trust computer system may transfer, from the one or more vault wallets to one or more digital wallets in the AP custody account, the assets being redeemed, and then transfer such assets being redeemed to the AP's one or more outside digital wallets. In embodiments, the AP wallet may be an AP custodial wallet. In embodiments, the trust computer system may delete or destroy one or more wallets involved in the transaction, e.g., the AP custody wallet and/or any vault wallets that were emptied, to name a few.

In step S214, the trustee may cancel and/or instruct to cancel, e.g., using the third-party clearing agency 250 (e.g., DTC), the AP's shares corresponding to the number of assets withdrawn and delivered to the AP.

In embodiments, in step S216, the AP may convert the assets to some other asset or currency or use them to conduct one or more transactions.

In embodiments, security measures, such as described with respect to FIG. 8, may be implemented. In embodiments, a wallet created on the isolated computer 30 may be copied in part to create a watching wallet that may create unsigned transactions and/or broadcast already signed transactions. In embodiments, the watching wallet may not contain private key data. The watching wallet may be loaded onto the networked computer 20. The networked computer 20 may then be used to create one or more unsigned transactions. The unsigned transaction data may be transferred from the networked computer 20 to the isolated computer 30. Such transfer may be manual, such as by downloading the unsigned transaction data to a removable storage device comprising computer readable medium (e.g., a USB flash drive, CD, CD-ROM, DVD, removable hard drive, disk, memory card, to name a few), physically disconnecting the storage device from the networked computer 20, operatively connecting the storage device to the isolated computer 30, and uploading the unsigned transaction data to the isolated computer 30. In embodiments, networked computer 20 may be connected, directly or indirectly, to isolated computer 30, which connection may comprise security measures, such as a firewall, designed to prevent unauthorized access of the isolated computer 30. After receiving the unsigned transaction data, the digital wallet on the isolated computer 30 may be used to sign the transaction. The signed transaction data may then be transferred from the isolated computer 30 to the networked computer 20 in any of the manners described herein. The networked computer 20 may then broadcast the signed transaction data to the network, which may complete the transaction.

FIG. 107C is a flow chart of another exemplary process for redemption of shares in an ETP.

In a step S2022, a trust computer system comprising one or more computers may determine share price information based at least in part upon a first quantity of digital math-based assets held by a trust at a first point in time and a second quantity of shares in the trust at the first point in time. In embodiments, the share price information may be transmitted to one or more authorized participant user devices. The share price information can comprise a net asset value per share, an adjusted net asset value per share, and/or a net asset value per a basket of shares (e.g., where the number of shares comprising the basket of shares may be associated with one creation unit of shares), to name a few. In embodiments, the basket of shares can comprise any of 5,000 shares, 10,000 shares, 15,000 shares, 25,000 shares, 50,000 shares, or 100,000 shares, to name a few.

In a step S2024, the trust computer system may receive from one or more authorized participant user devices of an authorized participant, an electronic request (e.g., a redemption order) to redeem a third quantity of shares.

In a step S2026, the trust computer system may determine a fourth quantity of digital math-based assets based at least in part upon the share price information and the third quantity of shares. In embodiments, determining the fourth quantity of digital assets may include obtaining a net asset value per share; determining a digital math-based asset value of the third quantity of shares based upon the net asset value per share; determining transaction fees (e.g., denominated in a unit of the digital math-based asset) and/or expenses associated with the electronic request to redeem shares; and determining the fourth quantity of digital math-based assets by subtracting the transaction fees from the digital math-based asset value of the third quantity of shares.

In a step S2028, the trust computer system may obtain one or more destination digital asset account identifiers corresponding to one or more destination digital asset accounts for receipt by the authorized participant of a transfer of the fourth quantity of digital math-based assets from the trust. The destination digital asset accounts may correspond to an authorized participant custody account.

In a step S2030, the trust computer system may obtain one or more origin digital asset account identifiers corresponding to one or more origin digital asset accounts for the transfer. In embodiments, the origin digital asset accounts may be securely stored accounts, as described herein. The origin digital asset accounts may correspond to a trust custody account.

In a step S2032, the trust computer system may initiate the transfer of the fourth quantity of digital math-based assets from the one or more origin digital asset accounts to the one or more destination digital asset accounts. Initiating a transfer of assets from the trust can comprise retrieving or causing to be retrieved (e.g., issuing retrieval instructions) one or more private keys associated with the one or more origin digital asset accounts, and accessing the one or more origin digital asset accounts using at least the one or more private keys.

Retrieving keys can comprise issuing retrieval instructions for retrieving a plurality of encrypted private keys corresponding to the one or more origin digital asset accounts; receiving, at the trust computer system, the plurality of encrypted private keys; and obtaining, using the trust computer system, one or more private keys by decrypting the plurality of private keys.

In other embodiments, retrieving keys can comprise issuing, using the trust computer system, retrieval instructions for retrieving a plurality of private key segments corresponding to the one or more origin digital asset accounts; receiving, at the trust computer system, the plurality of private key segments; and obtaining, using the trust computer system, one or more private keys by assembling the plurality of private keys.

In still other embodiments, retrieving keys can comprise issuing, using the trust computer system, retrieval instructions for retrieving a plurality of encrypted private key segments corresponding to the one or more origin digital asset accounts; receiving, at the trust computer system, the plurality of encrypted private key segments; and obtaining, using the trust computer system, one or more private keys by decrypting the plurality of private key segments and assembling the segments into one or more private keys.

For a multi-signature digital asset account, retrieving keys can comprise issuing, using the trust computer system, retrieval instructions for retrieving a plurality of encrypted private key segments corresponding to the one or more origin digital asset accounts; receiving, at the trust computer system, the plurality of encrypted private key segments; obtaining, using the trust computer system, one or more first private keys by decrypting the plurality of private key segments and assembling the segments into one or more first private keys; and obtaining, using the trust computer system, at least one second private key corresponding to the one or more origin digital asset accounts.

In a step S2034, the trust computer system may broadcast the transfer to a decentralized electronic ledger maintained by a plurality of physically remote computer systems.

In a step S2036, the trust computer system may verify, using the decentralized electronic ledger, a receipt of the fourth quantity of digital math-based assets at the one or more destination digital asset accounts. Transaction verification can comprise accessing, using the trust computer system, a plurality of updates to the decentralized electronic ledger (e.g., new blocks added to a BITCOIN blockchain); analyzing, using the trust computer system, each of the plurality of updates for a first confirmation of the receipt by a node in a network associated with the digital math-based asset; and determining, using the trust computer system, a final confirmation of the receipt after detecting first confirmations of the receipt in a predetermined number of the plurality of updates to the decentralized electronic ledger.

In a step S2038, the trust computer system may cancel or cause to be canceled (e.g., by issuing instructions to a third-party clearing agency) the third quantity of shares from the authorized participant.

In embodiments, the process can include determination of and/or institution of a settlement period associated with the electronic request to redeem shares.

In embodiments, the trust computer system may be operated by a trustee and/or an administrator of the trust.

In embodiments a system for determining and/or providing a blended digital math-based asset price can comprise one or more processors and one or more computer-readable media operatively connected to the one or more processors and having stored thereon instructions for carrying out the steps of (i) determining, by a trust computer system comprising one or more computers, share price information based at least in part upon a first quantity of digital math-based assets held by a trust at a first point in time and a second quantity of shares in the trust at the first point in time; (ii) receiving, at the trust computer system from the one or more authorized participant user devices of the authorized participant, an electronic request to redeem a third quantity of shares; (iii) determining, by the trust computer system, a fourth quantity of digital math-based assets based at least in part upon the share price information and the third quantity of shares; (iv) obtaining, by the trust computer system, one or more destination digital asset account identifiers corresponding to one or more destination digital asset accounts for receipt by the authorized participant of a transfer of the fourth quantity of digital math-based assets from the trust; (v) obtaining, using the trust computer system, one or more origin digital asset account identifiers corresponding to one or more origin digital asset accounts for the transfer; (vi) initiating, using the trust computer system, the transfer of the fourth quantity of digital math-based assets from the one or more origin digital asset accounts to the one or more destination digital asset accounts; (vii) broadcasting, using the trust computer system, the transfer to a decentralized electronic ledger maintained by a plurality of physically remote computer systems; (viii) verifying, by the trust computer system using the decentralized electronic ledger, a receipt of the fourth quantity of digital math-based assets at the one or more destination digital asset accounts; and (ix) canceling or causing to be canceled, using the trust computer system, the third quantity of shares from the authorized participant.

Redemption Distribution Waterfalls Among Wallets

In embodiments, a redemption distribution waterfall may be implemented using one or more computers based at least in part on one or more parameters. Retrieval distributions may be dictate the order in which digital wallets (and/or their associated private and/or public keys) are retrieved from storage (e.g., from varying levels of cold storage, such as an on-premises safe, nearby safety deposit box, and/or geographically remote bank or secure storage facility). Retrieval distributions may also dictate quantities of digital assets to transfer from each wallet. In embodiments, redemption distribution algorithms may control such retrievals, e.g., by generating retrieval instructions, indicating one or more wallets to retrieve, and/or indicating one or more amounts to transfer from each identified wallet. In embodiments, such parameters may include at least one or more of the following.

- the order in which the wallet was created (e.g., first wallet created is first wallet used, last wallet created is last wallet used, to name a few);
- the order in which the wallet was filled (e.g., first wallet filed is first wallet used, last wallet created is last wallet used, to name a few);
- a random order in which the wallet was created;
- a random order in which the wallet was filled;
- a random selection of the wallet;
- the vault in which the wallet is stored;
- the custodian of a vault storing the pair segments associated with a wallet;
- the amount of digital assets needed for a redemption compared to available in the wallet;
- the relative amount of digital assets held in the wallet (e.g., use the largest wallets first, use the smallest wallets first, to name a few); and/or
- the risk that a wallet has been compromised, to name a few.

Digital Asset Exchange

In embodiments, one form of trusted entity that may be an issuer of SVCoin or an agent of the issuer is a digital asset exchange or bank. In embodiments, the trusted entity may maintain an SVCoin database on a blockchain. In embodiments, the trusted entity may maintain the SVCoin database off chain as a sidechain which may be periodically or aperiodically published to a blockchain as discussed elsewhere.

In some embodiments, the trusted entity may be a digital asset exchange. A digital asset exchange, such as a digital math-based asset exchange, may allow users to sell digital assets in exchange for any other digital assets or fiat currency and/or may allow users to sell fiat currency in exchange for any digital assets. Accordingly, an exchange may allow users to buy digital assets in exchange for other digital assets or fiat currency and/or to buy fiat currency in exchange for digital assets. In embodiments, a digital asset exchange may integrate with a foreign exchange market or platform. A digital asset exchange may be configured as a centralized exchange or a decentralized exchange, as discussed herein.

In embodiments, the issuer of the SVCoin may be a digital asset exchange, a bank, a trust, or other trusted entity. In the context where a digital asset exchange may act as an issuer for SVCoin, or as an agent of the issuer, a digital asset exchange computer system may maintain a ledger as one or more databases associated with the SVCoin. Such a database may include an electronic log of all transactions, including the source wallet, the destination wallet, the timestamp of the transaction, the amount of the transaction (e.g., the number of SVCoin), and/or the balance in each wallet before and/or after the transaction. In embodiments, the database may include a list of wallet addresses and balances in each wallet of the SV Coin. In embodiments, the issuer may maintain the database by using a smart contract in association with a Contract Digital Address as part of a blockchain network, such as the ETHEREUM Network. In embodiments, the ledger may be maintained in a database as a sidechain which is periodically, or aperiodically, published to a blockchain such as the ETHEREUM blockchain. In embodiments, the ledger may be maintained directly on the blockchain.

FIG. 3 is a schematic diagram illustrating various potential participants in a digital asset exchange, in exemplary embodiments. The participants may be connected directly and/or indirectly, such as through a data network 15, as discussed herein. Users of a digital asset exchange may be customers of the exchange, such as digital asset buyers and/or digital asset sellers. Digital asset buyers may pay fiat (e.g., USD, Euro, Yen, to name a few) in exchange for digital assets (e.g., BITCOIN, ETHER, LITECOIN, DOGECOIN, to name a few). Digital asset sellers may exchange digital assets (e.g., BITCOIN, ETHER, LITECOIN, DOGECOIN, to name a few) for fiat (e.g., USD, Euro, Yen, to name a few). In embodiments, instead of fiat, other forms of digital assets may also be used.

In embodiments, users may connect to the exchange through one or more user electronic devices 3202 (e.g., 3202-1, 3202-2, . . . , 3202-N), such as computers, laptops, tablet computers, televisions, mobile phones, smartphones, and/or PDAs, to name a few. A user electronic device 3202 may access, connect to, and/or otherwise run one or more user digital wallets 3204. In embodiments, buyers and/or sellers may access the exchange using their own electronic devices and/or through a digital asset kiosk. A digital asset enabled kiosk can receive cash, including notes, coins or other legal tender, (of one or more fiat currencies) from a buyer to use in buying a quantity of digital assets. A digital asset kiosk may dispense cash (of one or more fiat currencies) to a seller of digital assets. In embodiments, a digital asset kiosk may receive funds from and/or dispense funds to a card, such as a prepaid or reloadable card, digital asset address associated with a digital wallet, or electronic account. In embodiments, a digital wallet may be stored on a user electronic device, such as a mobile electronic device, or other computing device.

Users may also have user bank accounts 3208 held at one or more banks 3206. In embodiments, users may be able to access their bank accounts from a user electronic device 3202 and/or from a digital wallet 3204 or digital address associated therewith.

A digital asset exchange computer system 3210 can include software running on one or more processors, as discussed herein, as well as computer-readable memory comprising one or more database. A digital asset exchange can include one or more exchange digital wallets 3212, e.g., digital wallet 3212-A. Exchange digital wallets may be used to store digital assets in one or more denominations from one or more parties to a transaction. In embodiments, exchange digital wallets may store digital assets owned by the exchange, which may be used where an exchange is a counter-party to an exchange transaction, which can allow exchange transactions to occur even when a buyer and a seller are not otherwise both available and in agreement on transaction terms.

A digital asset exchange may have one or more bank accounts, e.g., bank account 3216-A, held at one or more banks 3214, such as exchange banks or exchange partner banks, which are banks associated with and/or in partnership with the exchange. In embodiments, exchanges may access other repositories for fiat currency. An exchange bank account may be a pass-through account that receives fiat currency deposits from a digital asset buyer and transfers the fiat currency to a digital asset seller. The exchange bank account may hold money in escrow while an exchange transaction is pending. For example, the exchange bank account may hold a digital asset buyer's fiat currency until a digital asset seller transfers digital assets to a buyer, to an exchange, or to an authorized third party. Upon receipt by the appropriate recipient of the requisite amount of digital assets, the exchange may authorize the release of the fiat currency to the digital asset seller. In embodiments, an exchange may hold, e.g., as custodian, fiat in bank accounts and digital assets in digital wallets at associated digital asset addresses. In embodiments, instead of using bank accounts, other stable investment instruments such as money market mutual funds, treasury bills, certificates of deposits, low risk bonds, to name a few, may be used.

Figure 4A:
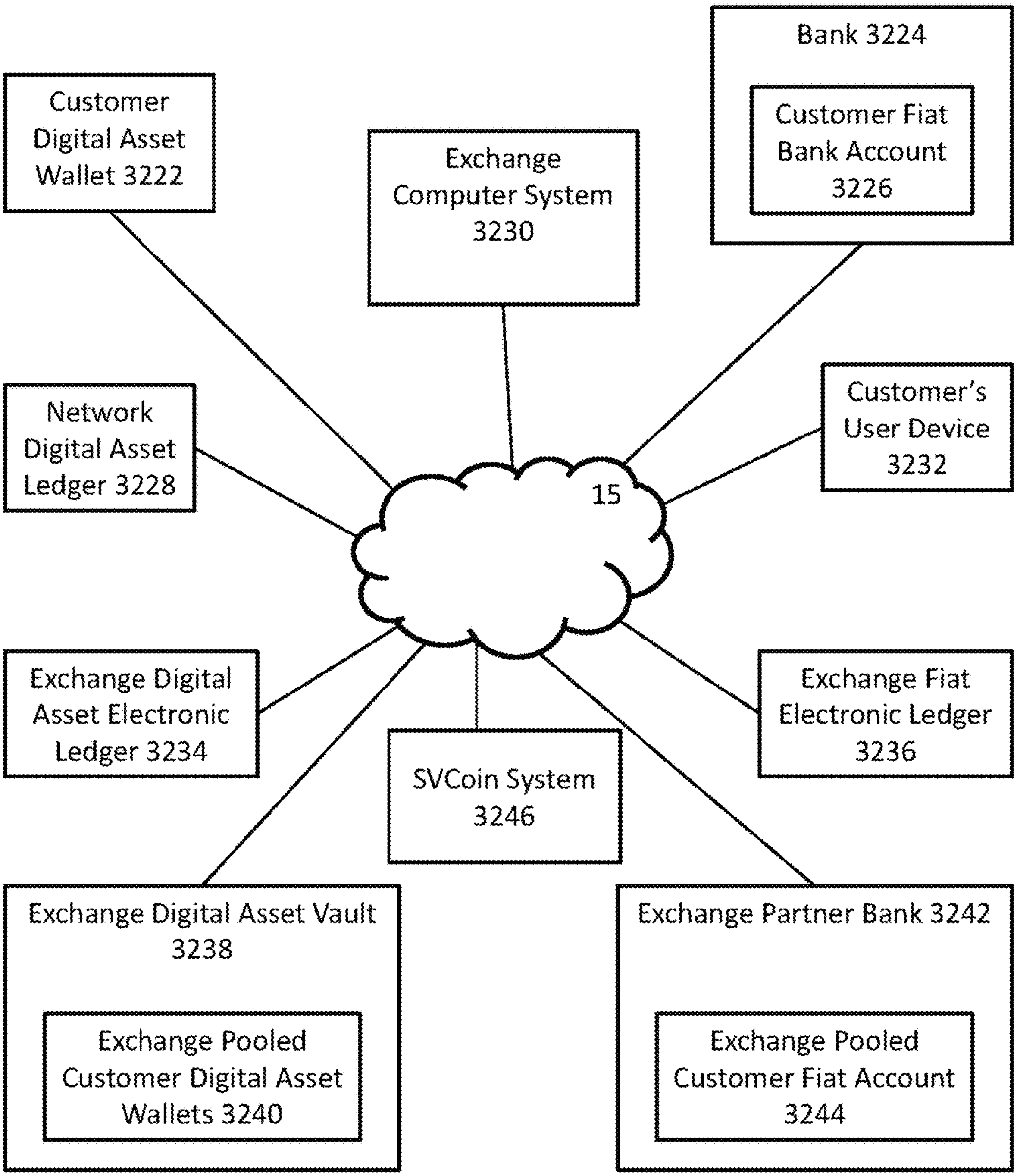
FIGS. 4A-4C are exemplary schematic diagrams illustrating participants in a digital asset exchange in accordance with exemplary embodiments of the present invention.
Figure 22A:
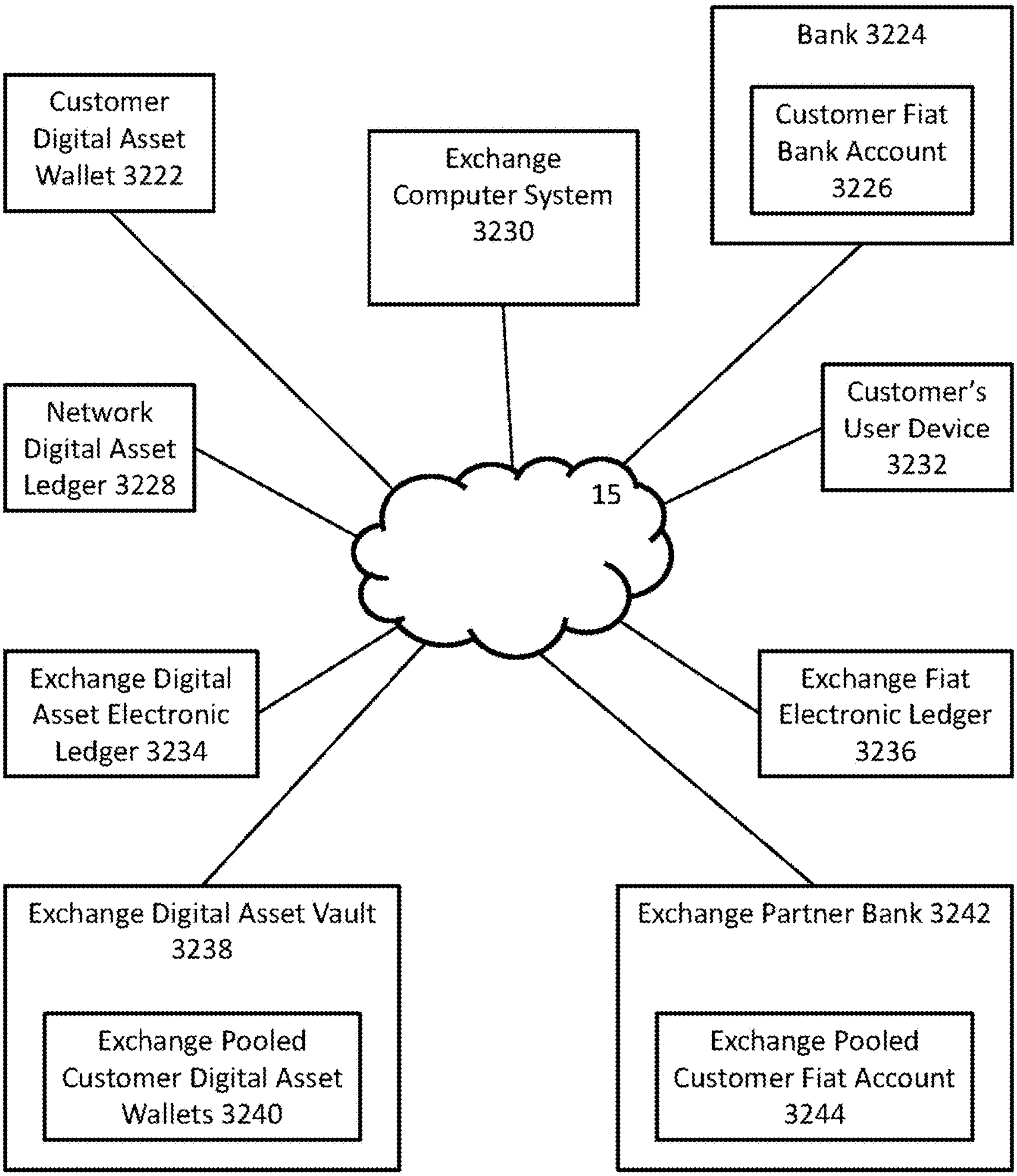
FIGS. 22A-22C are schematic diagrams illustrating participants in a digital asset exchange in accordance with exemplary embodiments of the present invention.

FIGS. 4A and 22A are additional schematic diagrams illustrating entities associated with a digital asset exchange in an exemplary embodiment of the present invention. Each entity may operate one or more computer systems. Computer systems may be connected directly or indirectly, such as through a data network. Entities associated with a digital asset exchange can include the exchange, an exchange computer system 3230, customer digital asset wallets at associated digital asset addresses 3222 (e.g., BITCOIN wallets, ETHER wallets, to name a few), customer bank(s) 3224 having a customer fiat bank account(s) 3226 and customer digital asset bank account(s) 3226-1 (as illustrated in connection with FIG. 4C), a network digital asset network ledger 3228 (e.g., the BITCOIN Blockchain, the ETHEREUM blockchain, to name a few), a digital asset network (e.g., the BITCOIN network, the ETHEREUM Network, to name a few), one or more exchange customers using one or more customer user devices 3232, an exchange digital asset electronic ledger 3234, one or more exchange digital asset vaults 3238, an exchange fiat electronic ledger 3236, and one or more exchange partner banks 3242, which can have exchange pooled customer fiat accounts 3244. The exchange digital asset vaults 3238 can store a plurality of digital asset wallets, which may be exchange pooled customer digital asset wallets 3240 with associated digital asset addresses. In embodiments, the exchange may have a single partner bank 3242 with a pooled exchange customer fiat account 3244. Such an account may be associated with insurance protection. In embodiments, as illustrated with respect to FIG. 4B (which is described in more detail in connection with FIG. 22B, the description of which applying herein), the exchange may have a SVCoin system 3246. Such a system may allow users to purchase SVCoin tokens using fiat currency and/or digital assets and/or to redeem digital assets in the form of SVCoin tokens, and/or to redeem SVCoin tokens for fiat currency. SVCoin system 3246 may also be used to generate new SVCoin tokens, and cancel redeem SVCoin tokens. SVCoin system 3246 is operatively connected to an SVCoin database that maintains a log of SVCoin tokens. In embodiments, the SVCoin database may be maintained as part of the digital asset network (e.g., the BITCOIN network, the ETHEREUM Network, to name a few).

The exchange may employ an electronic ledger system to track customer digital assets and/or customer fiat holdings. Such a system may allow rapid electronic transactions among exchange customers and/or between exchange customers and the exchange itself using its own digital asset and fiat holdings or those of its sponsor or owner. In embodiments, the electronic ledger system may facilitate rapid computer-based automated trading, which may comprise use by one or more computer systems of a trading API provided by the exchange. The electronic ledger system may also be used in conjunction with cold storage digital asset security systems by the exchange. Fiat (e.g., USD) and digital assets (e.g., BITCOIN or ETHER) can be electronically credited and/or electronically debited from respective (e.g., fiat and digital asset) electronic ledgers. Clearing of transactions may be recorded nearly instantaneously on the electronic ledgers. Deposits of fiat with the exchange and withdrawals from the exchange may be recorded on the electronic fiat ledger, while deposits and withdrawals of digital assets may be recorded on the electronic digital asset ledger. Electronic ledgers may be maintained using one or more computers operated by the exchange, its sponsor and/or agent, and stored on non-transitory computer-readable memory operatively connected to such one or more computers. In embodiments, electronic ledgers can be in the form of a database.

A digital asset exchange computer system can include one or more software modules programmed with computer-readable electronic instructions to perform one or more operations associated with the exchange. Each module can be stored on non-transitory computer-readable memory operatively connected to such one or more computers. An exchange may have a user on-boarding module to register users with the exchange and/or create accounts for new and/or existing exchange users. The exchange may employ systems and methods to ensure that the identity of exchange customers is verified and/or the destination of fiat currency and/or digital assets is known.

FIG. 22A is another schematic diagram illustrating entities associated with a digital asset exchange in an exemplary embodiment of the present invention. Each entity may operate one or more computer systems. Computer systems may be connected directly or indirectly, such as through a data network. Entities associated with a digital asset exchange can include the exchange, an exchange computer system 3230, customer digital asset wallets 3222 at associated digital asset addresses (e.g., BITCOIN wallets, ETHER wallets, to name a few), customer bank(s) 3224 having customer fiat bank account(s) 3226 and customer digital asset bank account(s) 3226-1 (as illustrated in connection with FIG. 22C), a network digital asset ledger 3228 (e.g., the BITCOIN Blockchain, the ETHEREUM blockchain, to name a few), a digital asset network (e.g., the BITCOIN network), one or more exchange customers using one or more customer user devices 3232, an exchange digital asset electronic ledger 3234, one or more exchange digital asset vaults 3238, an exchange fiat electronic ledger 3236, and one or more exchange partner banks 3242, which can have exchange pooled customer fiat accounts 3244. The exchange digital asset vaults 3238 can store a plurality of digital asset wallets, which may be exchange pooled customer digital asset wallets 3240 with associated digital asset addresses. In embodiments, the exchange may have an exchange partner bank 3242 with an exchange pooled customer fiat account 3244. Such an account may be associated with insurance protection.

The exchange may employ an electronic ledger system to track customer digital assets and/or customer fiat holdings. Such a system may allow rapid electronic transactions among exchange customers and/or between exchange customers and the exchange itself using its own digital asset and fiat holdings or those of its sponsor or owner. In embodiments, the electronic ledger system may facilitate rapid computer-based automated trading, which may comprise use by one or more computer systems of a trading API provided by the exchange. The electronic ledger system may also be used in conjunction with cold storage digital asset security systems by the exchange. Fiat (e.g., USD) and digital assets (e.g., BITCOIN or ETHER) can be electronically credited and/or electronically debited from respective (e.g., fiat and digital asset) electronic ledgers. Clearing of transactions may be recorded nearly instantaneously on the electronic ledgers. Deposits of fiat with the exchange and withdrawals from the exchange may be recorded on the electronic fiat ledger, while deposits and withdrawals of digital assets may be recorded on the electronic digital asset ledger. Electronic ledgers may be maintained using one or more computers operated by the exchange, its sponsor and/or agent, and stored on non-transitory computer-readable memory operatively connected to such one or more computers. In embodiments, electronic ledgers can be in the form of a database.

A digital asset exchange computer system can include one or more software modules programmed with computer-readable electronic instructions to perform one or more operations associated with the exchange. Each module can be stored on non-transitory computer-readable memory operatively connected to such one or more computers. An exchange may have a user on-boarding module to register users with the exchange and/or create accounts for new and/or existing exchange users. The exchange may employ systems and methods to ensure that the identity of exchange customers is verified and/or the destination of fiat currency and/or digital assets is known. Accordingly, the exchange may require new exchange customers to provide valid (e.g., complying with certain types, such as a driver's license or passport, or complying with certain characteristics) photo identification, a current address, a current bill, such as a utility bill, biometric information (e.g., a fingerprint or hand scan), and/or bank account information. A user on-boarding module can include back-end computer processes to verify and store user data as well as a front-end user interface by which a user can provide information to the exchange, select options, and/or receive information (e.g., through a display). The user on-boarding module can provide the front-end interface to one or more user devices and/or platforms, such as a computer, mobile phone (e.g., running an exchange-related mobile application), and/or digital asset kiosk, to name a few.

Figure 4B:
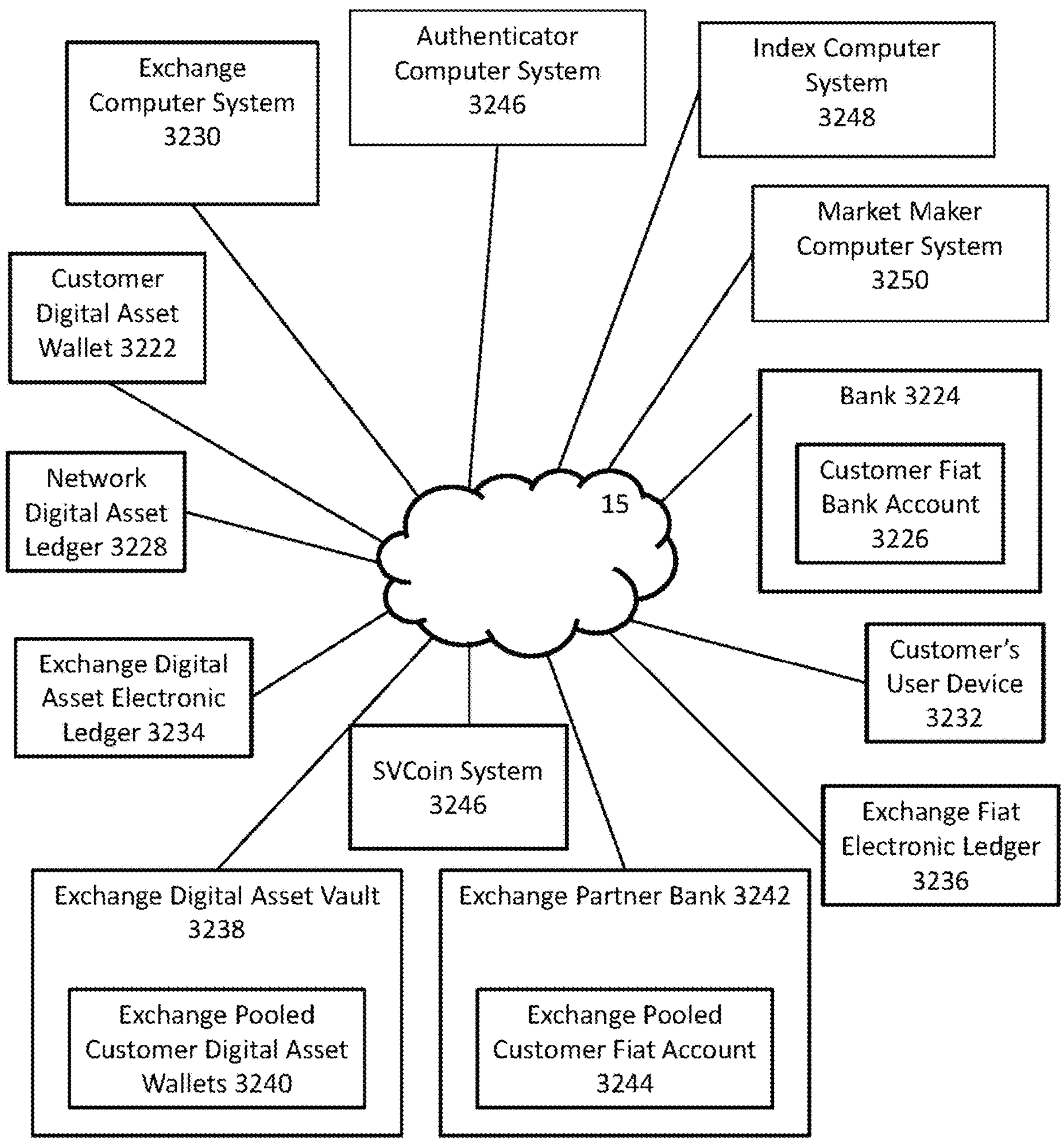
Figure 4C:
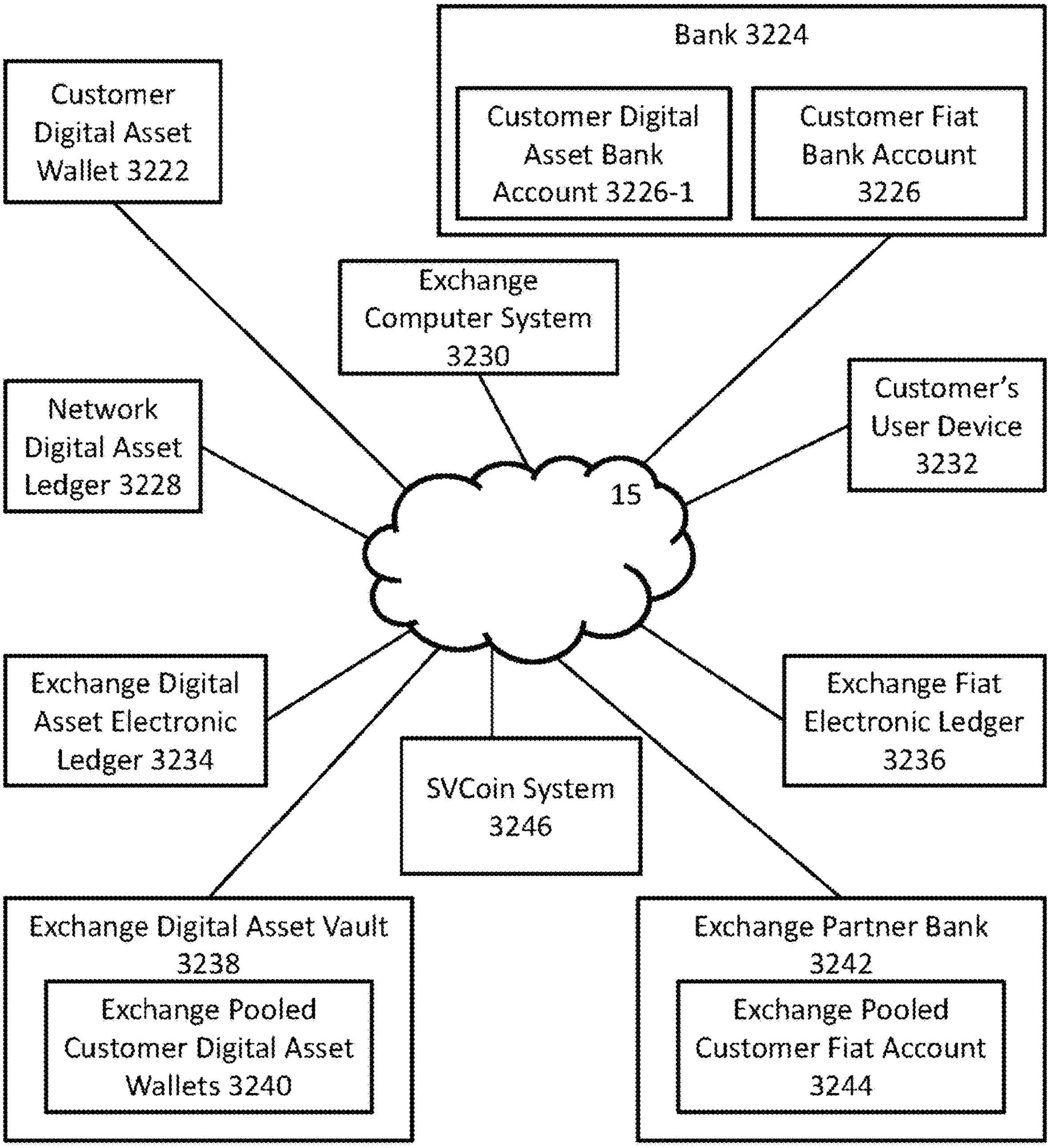
Figure 22B:
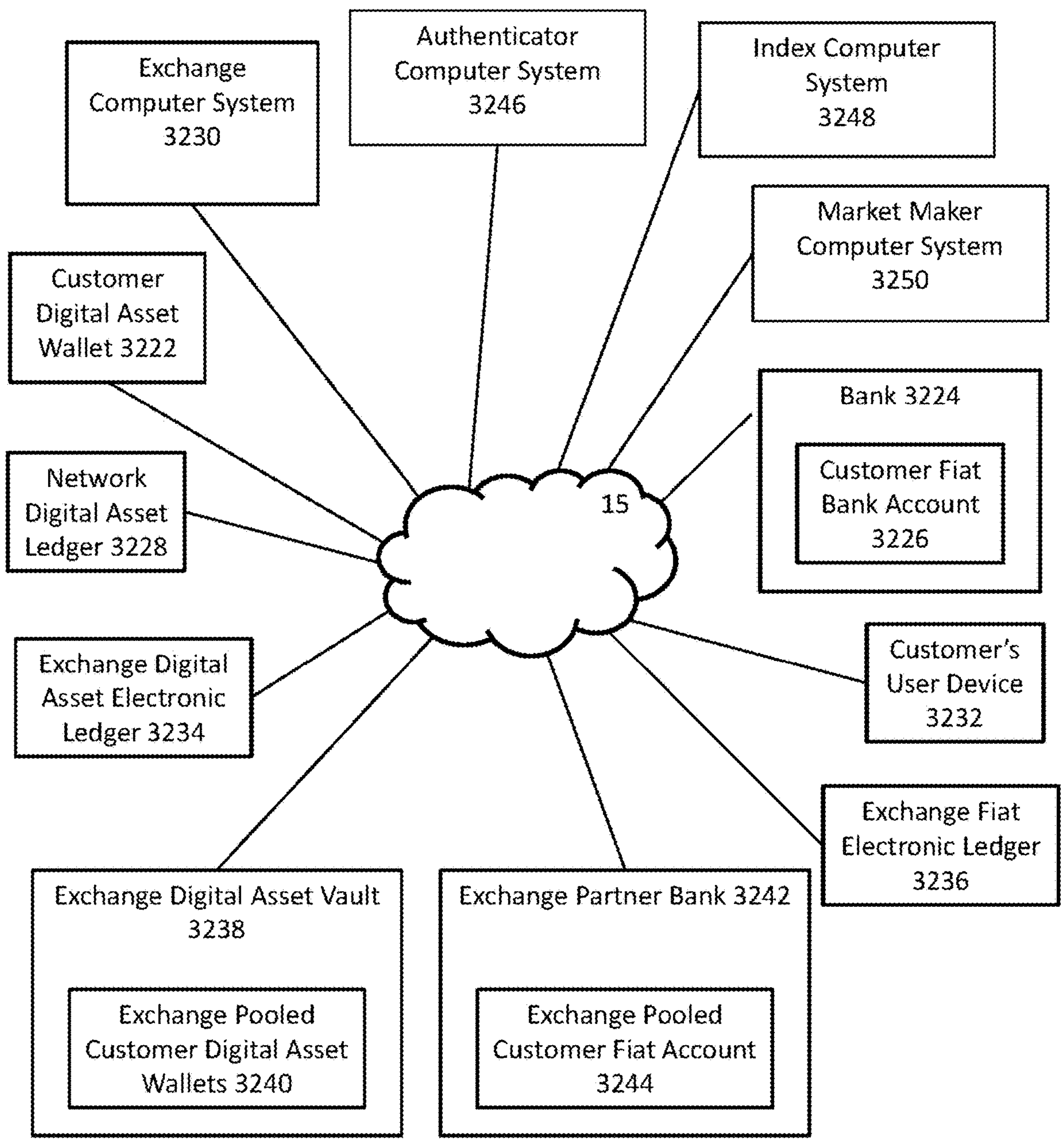
Figure 22C:
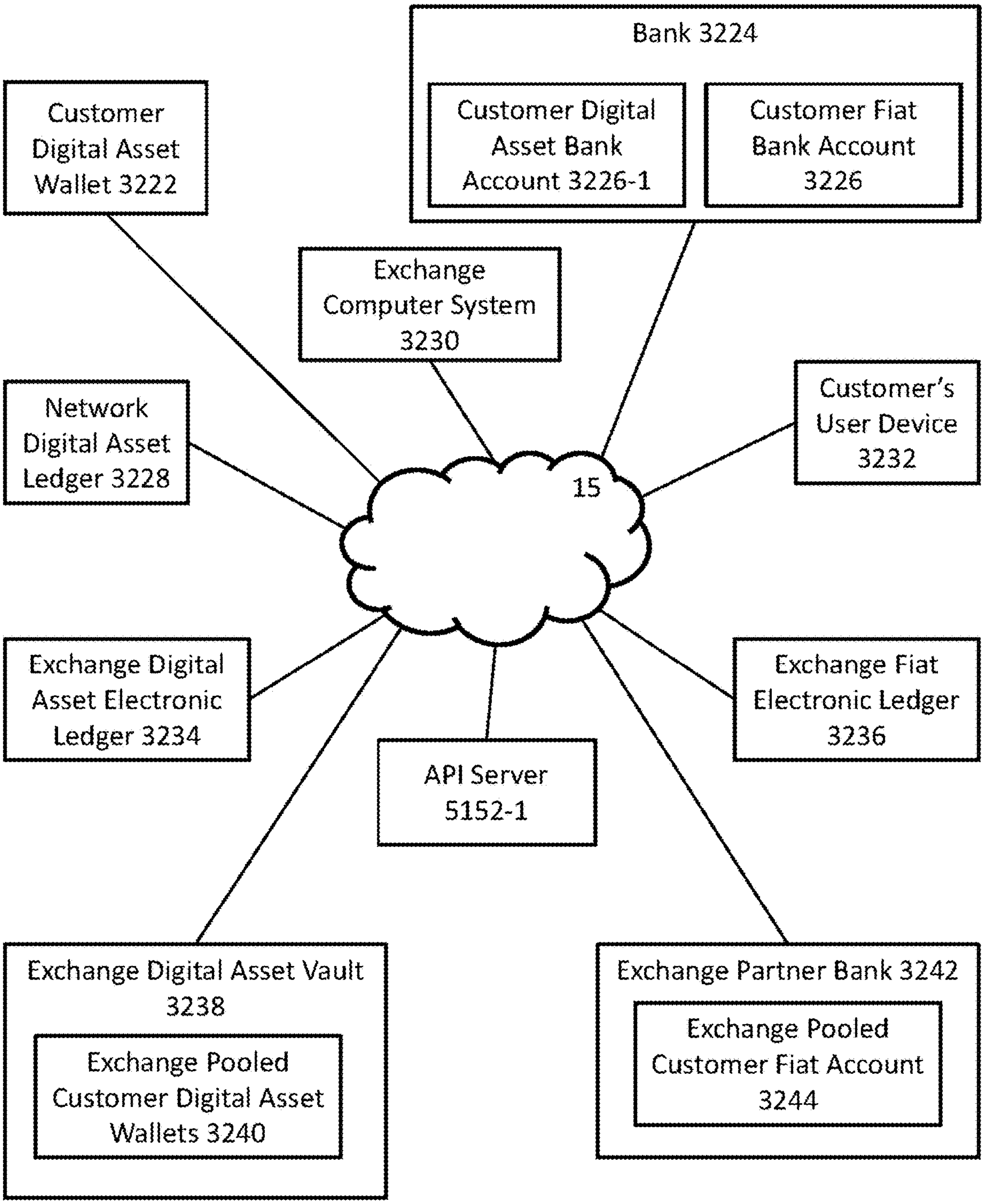

FIGS. 4B and 22B shows another schematic diagram illustrating entities associated with a digital asset exchange in an exemplary embodiment of the present invention. In addition to the participants described with respect to FIG. 22A and FIG. 4A, as illustrated in FIGS. 22B and 4B, a digital asset exchange may communicate with an authenticator computer system 3246 (to authenticate users, e.g., using multi-factor authentication and/or comparisons to databases of flagged users, to name a few), an index computer system 3248 (e.g., for generating and/or providing a digital asset index, which may be a price index), and/or a market maker computer system 3250. A market maker may be an exchange user that provides liquidity for the exchange, by purchasing or selling digital assets.

In embodiments, an exchange computer system may calculate different fees for a market maker. The fee calculation may vary with market conditions, such as price, digital asset supply (e.g., sell orders), and digital asset demand (e.g., buy orders). In embodiments, transaction fees charged by an exchange may be different for purchase and sale transactions. Fees may be based upon a user's identity, a user's transaction history, the quantity of digital assets and/or fiat currency associated with a user account, a rate schedule associated with a particular account or account type (e.g., there could be different rates for institutional or foreign users), time of day, and/or whether the user is operating as a market maker or a market taker for a given transaction, to name a few.

Figure 5A:
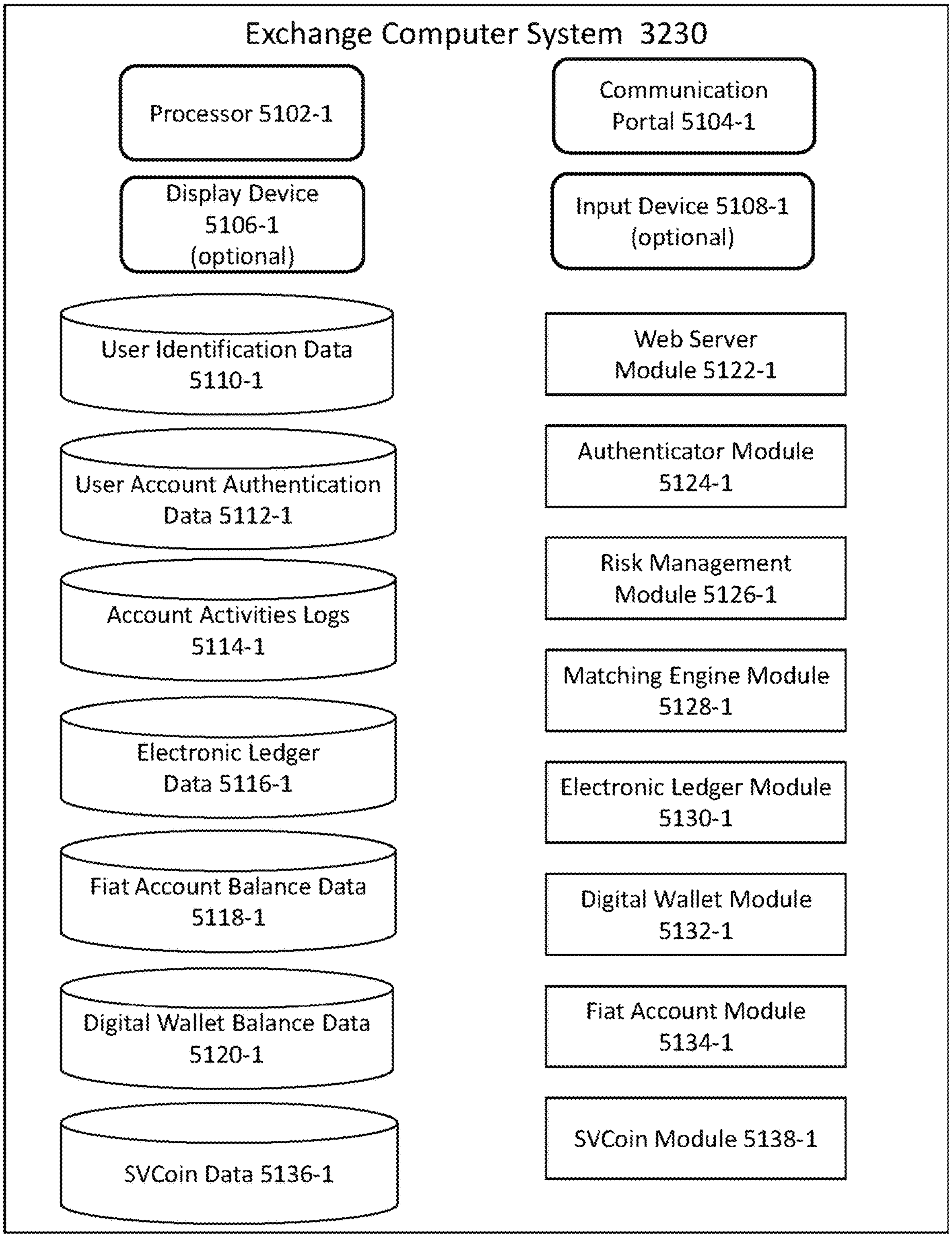
FIGS. 5A-5C are schematic diagrams of exemplary exchange computer systems in accordance with exemplary embodiments of the present invention.
Figure 5B:
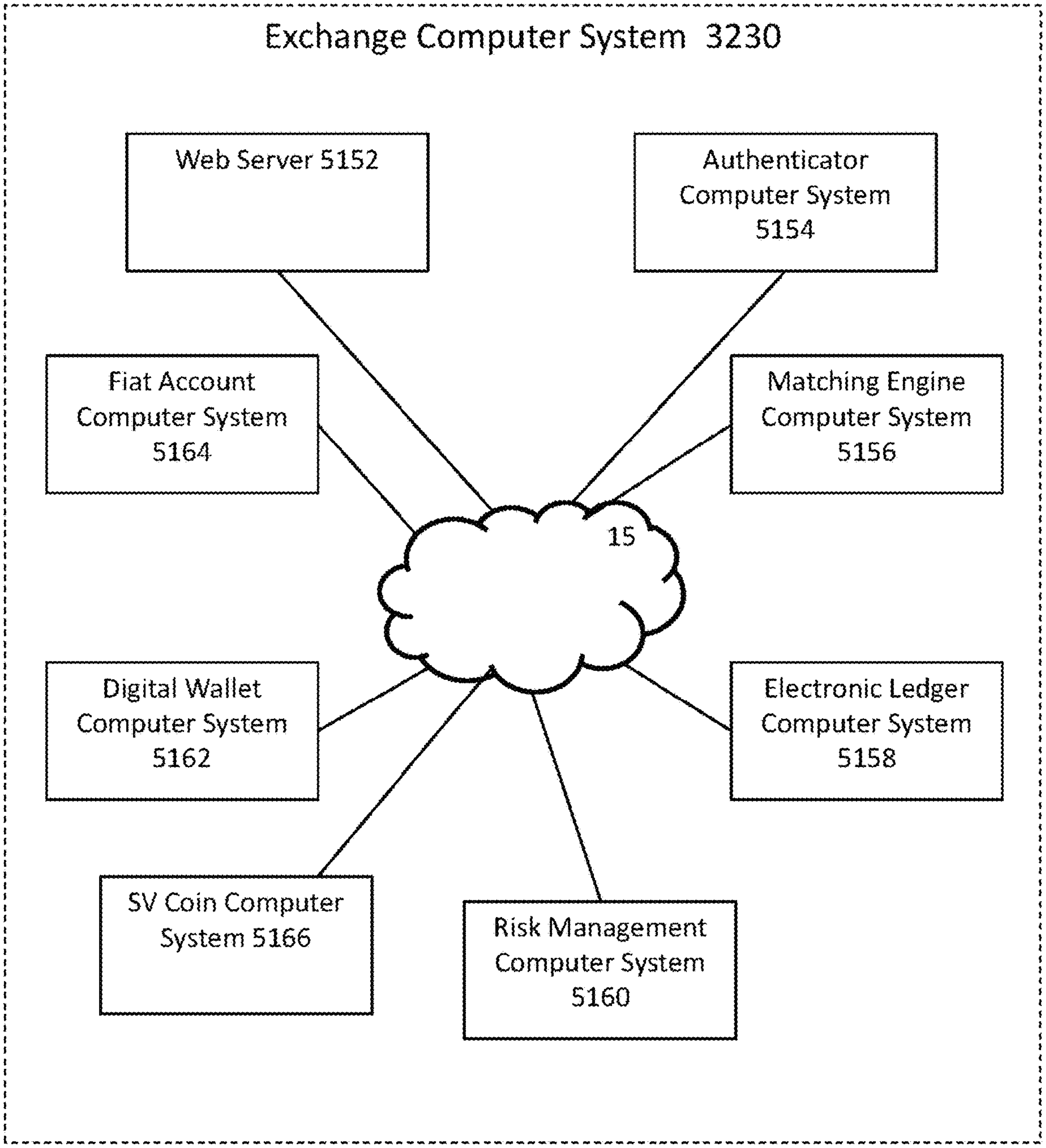
Figure 5C:
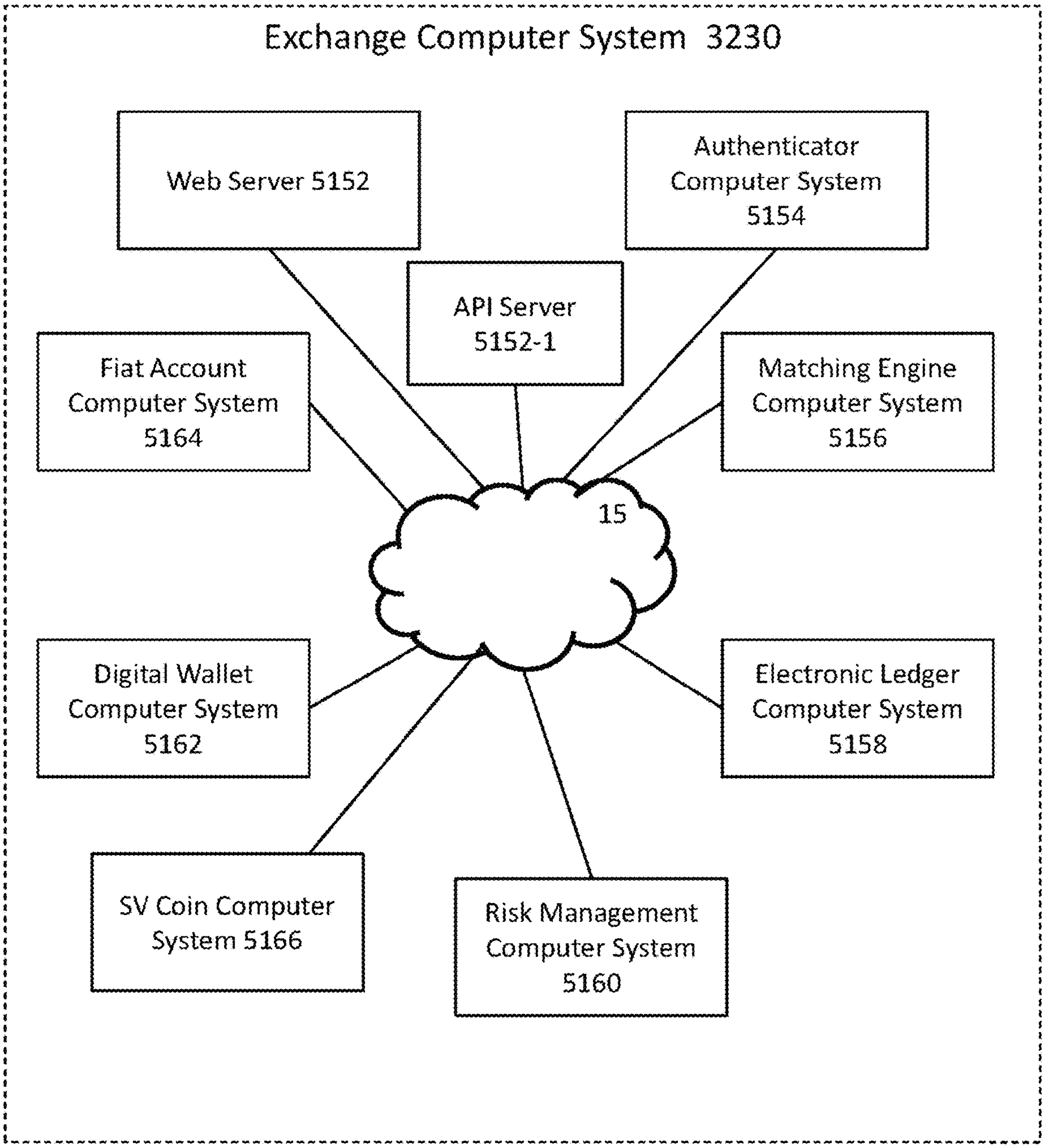

FIGS. 5A-C are schematic diagrams of exemplary exchange computer systems in accordance with exemplary embodiments of the present invention. FIG. 5A shows hardware, data, and software modules, which may run on one or more computers. FIG. 5B shows an exemplary distributed architecture for the exchange computer system.

As shown in FIG. 5A, an exchange computer system 3230 can include one or more processors 5102-1, a communication portal 5104-1 (e.g., for sending and/or receiving data), a display device 5106-1, and/or an input device 5108-1. The exchange computer system 3230 can also include non-transitory computer-readable memory with one or more database and data stored thereon. Data can include user identification data 5110-1 (e.g., know your customer data obtained during the user onboarding process), user account authentication data 5112-1 (e.g., login credentials, multi-factor authentication data, and/or anti-money laundering verifications), account activities logs 5114-1, electronic ledger data 5116-1, fiat account balance data 5118-1, digital wallet balance data 5120-1, and/or SVCoin data 5136-1, to name a few. One or more software modules may be stored in the memory and running or configured to run on the one or more processors. Such modules can include a web server module 5122-1, authenticator module 5124-1, risk management module 5126-1, matching engine module 5128-1, electronic ledger module 5130-1, digital wallet module 5132-1, fiat account module 5134-1 and/or SVCoin module 5138-1, to name a few. The processes performed by such modules, the data produced thereby and/or the data accessed thereby are described herein.

A matching engine 5128-1 may apply a continuous order book price time priority matching algorithm. In embodiments, matching engine 5128-1 may apply option points at low and/or high frequencies. In embodiments, other matching engines may be included, such as a block trade matching engine (not shown), an auction matching engine (not shown), to name a few.

As shown in FIG. 5B an exchange computer system can include a web server 5152, an authenticator computer system 5154, a matching engine computer system 5156, an electronic ledger computer system 5158, a risk management computer system 5160, a digital wallet computer system 5162, a fiat account computer system 5164, and/or a SV Coin Computer System 5166. The exchange computer system 3230 may communicate with one or more external computer systems, such as bank computer systems, index computer systems, user computer systems (e.g., institutional or individual users), and/or user electronic devices, to name a few. Each computer system may comprise one or more computers and/or one or more processors, a communication portal, display devices, and/or input devices, to name a few.

A web server 5152 may provide display data to one or more user device 102, e.g., user device 102-1. Display data may comprise website content (e.g., HTML, JavaScript, and/or other data from which a user device can generate and/or render one or more webpages) and/or application content, such as mobile application content, to be used in generating or providing display content for one or more software application. In embodiments, the web server 5152 may authenticate a user account by verifying a received username and password combination. In embodiments, other authentication processes may also be used.

An authenticator computer system 5154 may perform authentication of user login credentials, multi-factor authentication, and/or compare users against databases, such as government databases, for compliance with anti-money laundering laws and/or regulations, to name a few.

A matching engine computer system 5156 may match buy (purchase) orders with sell orders, receive orders, and/or update an electronic order book, to name a few.

An electronic ledger computer system 5158 may track and/or store account balances, update account balances, compute account balances, report account balances, and/or place holds on account funds while transactions are in progress (e.g., set an account hold indicator), to name a few.

A risk management computer system 5160 may perform processes to detect fraudulent transactions and/or security breaches, to name a few. Such a sub-system may monitor access data describing access of the exchange (e.g., IP addresses, accounts, times of access, to name a few), monitor trading data, analyze trading data, determine patterns, determine anomalies, and/or determine violations of pre-programmed security rules, to name a few.

A digital wallet computer system 5162 may generate digital wallets with associated digital asset addresses, generate instructions for digital wallet key storage and/or retrieval, allocate digital assets among digital wallets, track digital assets, store digital asset, and/or transfer digital assets, to name a few.

The digital wallets may include both hot wallets and cold wallets. In embodiments, sufficient digital assets will be stored in one or more hot wallets to allow for liquidity. The amount of digital assets stored in the one or more hot wallets may be determined based on historical averages of trading on the exchange. In embodiments, remaining digital assets will preferably be held in cold wallets. A more detailed discussion of hot wallets and cold wallets is presented in U.S. Pat. No. 9,892,460 issued Feb. 13, 2018 entitled SYSTEMS, METHODS, AND PROGRAM PRODUCTS FOR OPERATING EXCHANGE TRADED PRODUCTS HOLDING DIGITAL MATH-BASED ASSETS, the entire content of which is incorporated herein.

A fiat account computer system 5164 may manage omnibus or pooled accounts for holding customer funds. The fiat account computer system may process receipts of funds, e.g., from a bank, via a wire transfer, via a credit card or ACH transfer, and/or via check, to name a few. Accordingly, the fiat account computer system may communicate with one or more external systems, such as a bank computer system. In embodiments, the fiat account computer system may process withdrawals. In embodiments, the omnibus or pooled accounts for holding fiat are maintained in a bank or other institution such that these accounts are eligible for insurance under the Federal Deposit Insurance Corporation (FDIC). In order to qualify for FDIC insurance, an account must typically be associated with specific user identification information, e.g., a user name, address and social security number, by way of example, to name a few. Accordingly, in embodiments, fiat accounts may be associated with individuals who are positively identified. In such embodiments, SVCoin holders may be required to provide the identification information discussed above prior to purchasing SVCoins. Further, the SVCoin issuer will maintain a database including this information for each SVCoin holder. In embodiments, the fiat may be invested in federally insured interest bearing bank accounts, treasure bills, bonds (such as high quality bonds), CD's, money market mutual funds, repos or other financial instruments which offer a return and provide sufficient stability, to name a few.

A SVCoin computer system 5166 may manage purchases of SVCoin tokens using fiat currency and/or digital assets and/or redemption of digital assets in the form of SVCoin tokens, and/or redemption of SVCoin tokens for fiat currency. SVCoin computer system 5166 may also generate new SVCoin tokens and cancel redeem SVCoin tokens. SVCoin computer system 5166 is operatively connected to an SVCoin database 5136 that maintains a log of SVCoin tokens. In embodiments, the SVCoin database 5136 is maintained by the use of smart contract code associated with a Contract Address on the digital asset blockchain though the digital asset network.

As shown in FIG. 5C an exchange computer system can include a web server 5152, an authenticator computer system 5154, a matching engine computer system 5156, an electronic ledger computer system 5158, a risk management computer system 5160, a digital wallet computer system 5162, a fiat account computer system 5164, SV Coin Computer System 5166, and/or API Server 5152-1. An API Server 5152-1 (i.e., an Application Programming Interface Server 5152-1) may include one or more processor(s) capable of executing machine-executable instructions to establish and/or maintain connection between two or more applications.

API is the acronym for Application Programming Interface, which is a software intermediary that allows two applications to talk to each other.

Figure 6:
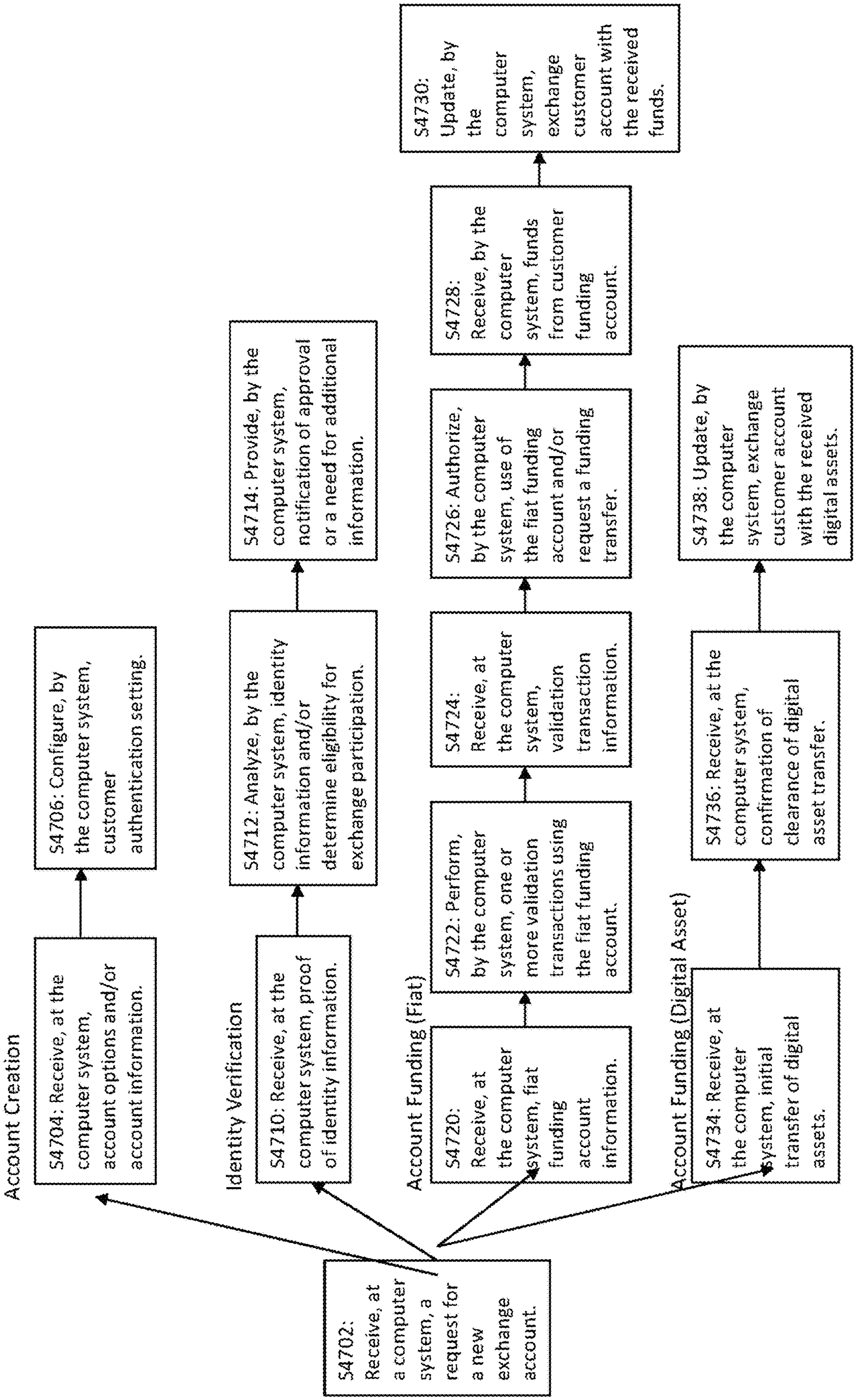
FIG. 6 is an exemplary flow chart for processes for digital asset exchange account creation and account funding in accordance with exemplary embodiments of the present invention.

Referring to the fiat account funding process shown in FIG. 6, in step S4720 the exchange computer system may receive fiat funding account information. Such information can include a bank account number (e.g., a routing number), a bank name, an account type, and/or an account holder's name, to name a few. In step S4722, the exchange computer system may perform one or more validation transactions using the fiat funding account. Such transactions may comprise small deposits into the fiat funding account. In step S4724, the exchange computer system may receive validation transaction information, which may include a transaction amount, date, and/or time. In step S4726, the exchange computer system may electronically authorize use of the fiat funding account and/or request a funding transfer. Accordingly, the exchange computer system may provide an electronic notification, e.g., via email, via a website, and/or via a mobile phone application (e.g., via a push notification), to name a few, that the fiat funding account is authorized for use with the exchange. A customer may electronically initiate a transaction, e.g., through an exchange-provided user interface or user electronic device operatively connected to the exchange or an application programming interface (API), to name a few, to transfer funds to the exchange. In step S4728, the exchange computer system may receive an electronic notification indicating that funds were received, e.g., in an exchange bank account at a partner bank, from the customer fiat funding account. In step S4730, the exchange computer system can update an exchange customer account with the received funds. Updating an exchange customer account can comprise electronically updating a flat electronic ledger stored one or more computer readable media operatively connected to the exchange computer system to reflect the received funds and/or updating a display of the amount of funds in the account or a data ledger on a user computer device or on a printed and/or digitally transmitted receipt provided to the user and/or a user device.

Referring to the digital asset account funding process shown in FIG. 6, in step S4734, the exchange computer system can receive an initial transfer of digital assets. In step S4736, the exchange computer system can receive a confirmation of clearance of the digital asset transfer. In step S4738, the exchange computer system can update an exchange customer account with the received digital assets. Updating an exchange customer account can include making an electronic entry in an exchange digital asset electronic ledger and/or providing a notification that the digital assets are received.

Figure 7A:
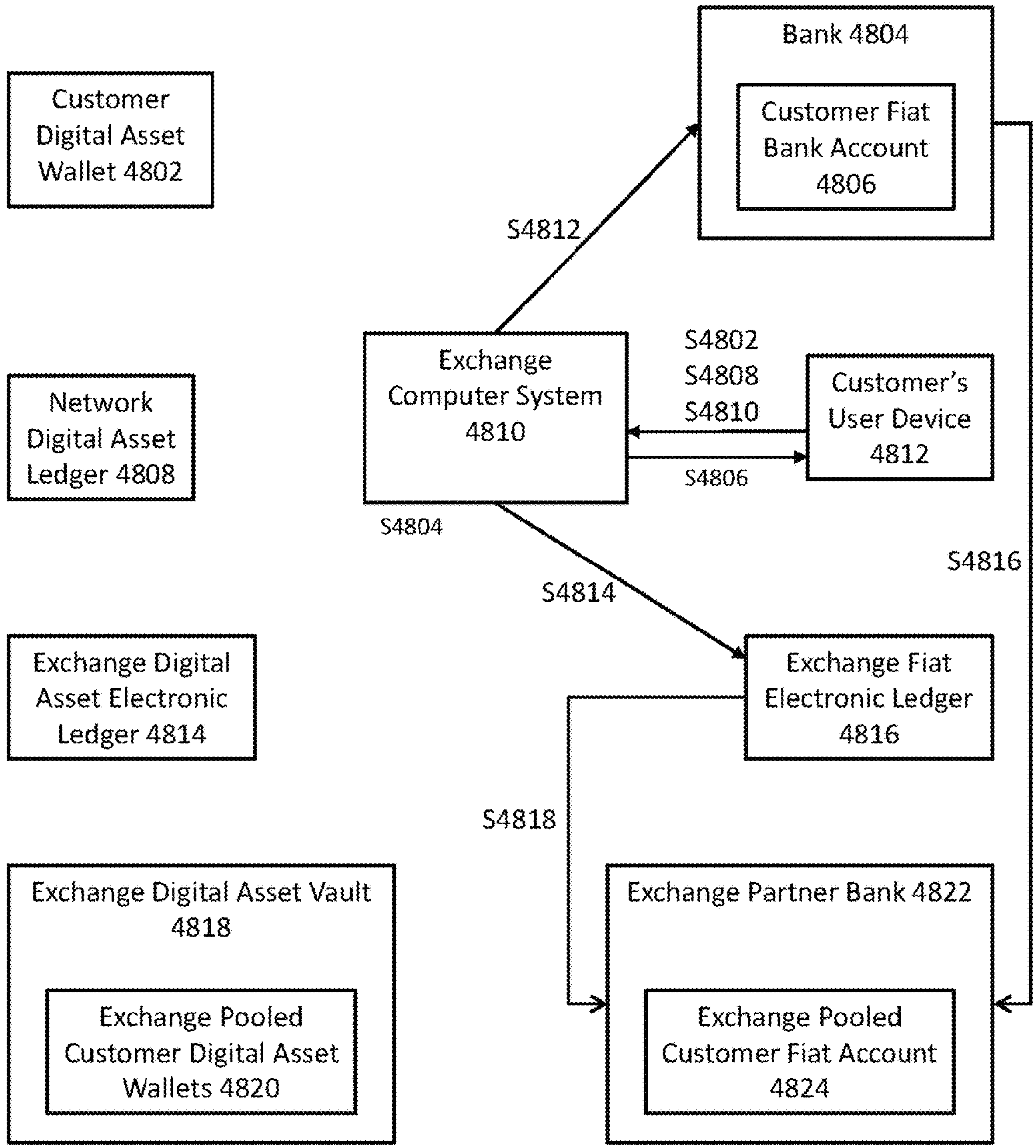
FIGS. 7A-7B are an exemplary schematic diagram and a corresponding flow chart of a process for digital asset exchange customer account fiat funding via an exchange-initiated request in accordance with exemplary embodiments of the present invention.
Figure 7B:
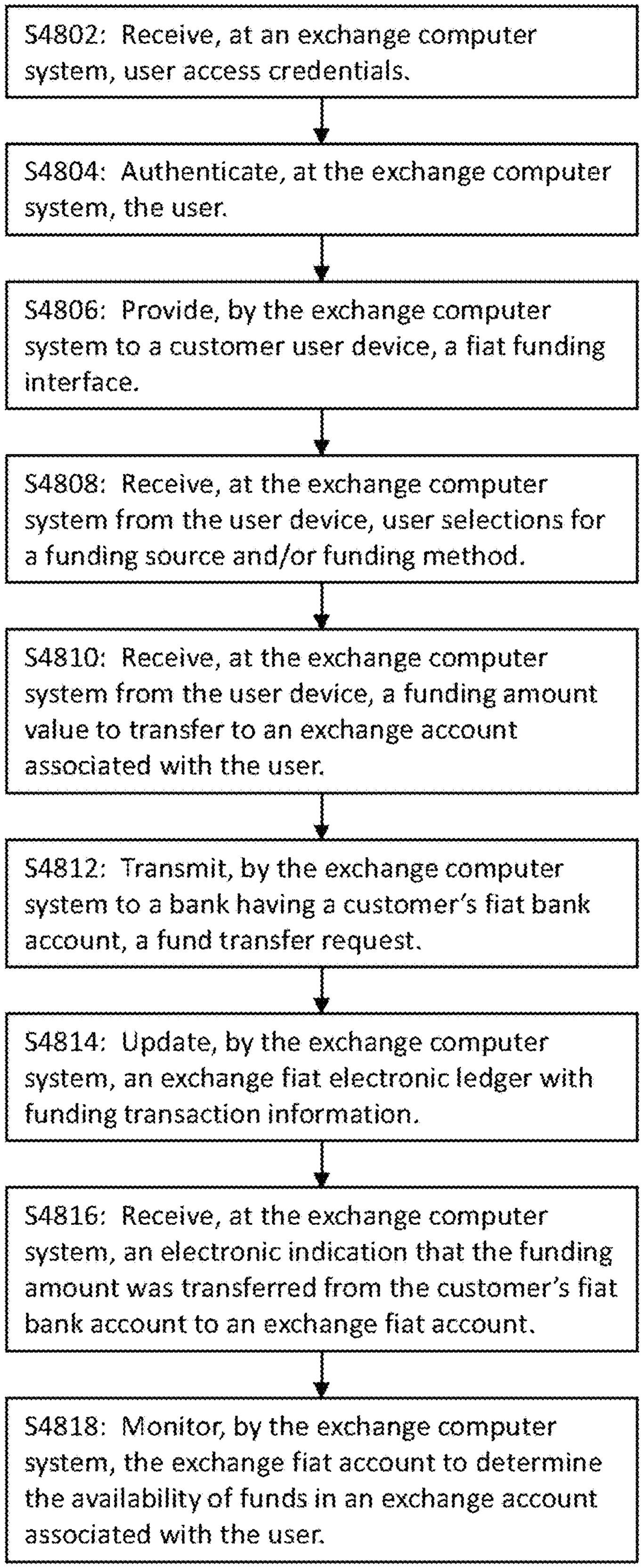

FIG. 7A is an exemplary schematic diagram of an exchange, and FIG. 7B is a corresponding flow chart of a process for digital asset exchange customer account fiat funding via an exchange-initiated request, such as ACH in accordance with exemplary embodiments of the present invention. An exchange computer system 4810 can interface with a customer digital asset wallet 4802, a bank 4804 with a customer fiat bank account 4806, an exchange partner bank 4822 with an exchange pooled customer fiat account 4824, a network digital asset ledger 4808, and/or a customer's user device 4812, to name a few. In addition to the exchange computer system 4810, the exchange can include an exchange digital asset electronic ledger 4814, an exchange fiat electronic ledger 4816, and an exchange digital asset vault 4818 with exchange pooled customer digital asset wallets 4820 with associated digital asset addresses. Any of these entities or components may communicate directly and/or indirectly, e.g., through a data network, such as the Internet. In embodiments, encryption and/or other security protocols may be used. These entities and components are further described with respect to FIG. 4A.

Referring to FIG. 7B, in step S4802 the exchange computer system can receive, e.g., from a user device, user access credentials. In step S4804, the exchange computer system can authenticate the user, such as by verifying the received access credentials. In step S4806, the exchange computer system may provide to a customer user device a fiat funding interface. In step S4808, the exchange computer system may receive from the user device user selections for a funding source and/or funding method. The funding source may identify a bank account or other fiat account. The funding method may identify ACH transfer or wire transfer, to name a few. In step S4810, the exchange computer system can receive from the user device a funding amount value to transfer to an exchange account associated with the user. In some embodiments, step S4808 and step S4810 may be a single step or may occur substantially simultaneously. Accordingly, the exchange computer system may receive from a user electronic device a user electronic request comprising a funding amount and a funding method. In embodiments, the funding method may be an ACH transfer and the request further identifies a verified user bank account.

In step S4812, the exchange computer system can transmit a fund transfer request to a bank where the customer has a fiat bank account. Accordingly, the exchange computer system may transmit to an exchange partner bank an electronic funding request comprising the funding amount and the user bank account identifier.

In step S4814, the exchange computer system can update an exchange fiat electronic ledger with the funding transaction information. In step S4816, the exchange computer system can receive an electronic indication that the funding amount was transferred from the customer's fiat bank account to an exchange fiat account, e.g., at a partner bank. In step S4818, the exchange computer system can monitor the exchange fiat account to determine the availability of funds in an exchange account associated with the user. In embodiments, the exchange computer system may generate and/or provide an electronic notification to one or more user devices associated with a user account that funds are available for use on the exchange. In embodiments, the notification may indicate a current balance of a user account (e.g., in fiat currency and/or digital asset quantities).

Figure 7C:
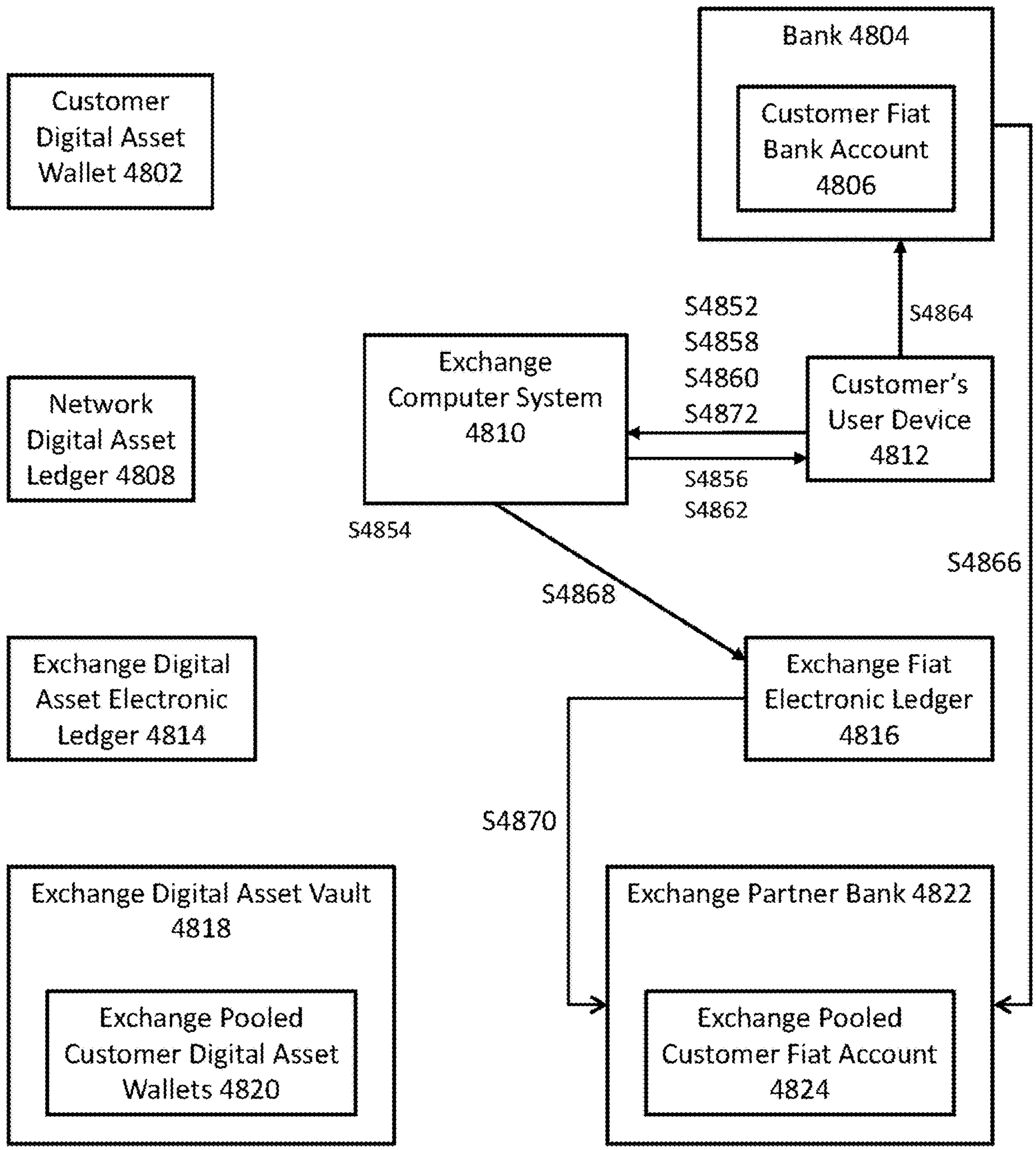

FIG. 7C is an exemplary schematic diagram of an exchange, and FIG. 7D is a corresponding flow chart of a process for digital asset exchange customer account fiat funding via a customer-initiated request, such as a wire transfer, in accordance with exemplary embodiments of the present invention. The components and entities associated with an exchange that are shown in FIG. 7C may be similar to the components and entities associate with an exchange described above with respect to FIG. 4A, the description of which applying herein.

FIG. 7D is a flow chart showing an exemplary process for digital asset exchange customer account fiat funding. In step S4852, an exchange computer system can receive user access credentials. In step S4854, the exchange computer system can authenticate the user by verifying the received access credentials. Verifying the access credentials can comprise comparing the credentials to a secure credentials database. In step S4856, the exchange computer system can provide to a customer user device a fiat funding interface. In step S4858, the exchange computer system can receive from the customer user device, user selections for a funding source and/or funding method. The funding method may be a customer-initiated method, such as a wire transfer. In step S4860, the exchange computer system can receive a funding amount value to transfer to an exchange account associated with the user. In step S4862, the exchange computer system can provide to the customer user device fund transfer instruction, e.g., wire instructions. In step S4864, the exchange computer system may receive an electronic indication of a customer-initiated fund transfer from a customer fiat bank account a customer bank to an exchange fiat account at an exchange partner bank according to the fund transfer instructions. In embodiments, step S4864 may be skipped. In step S4866, the exchange computer system may receive an indication that the funding amount was transferred from the customer's fiat bank account to the exchange fiat account. In step S4868, the exchange computer system can update an exchange fiat electronic ledger with the funding transaction information, which may include an amount value, customer account ID, transaction date and/or time, to name a few. In step S4870, the exchange computer system can monitor the exchange fiat account to determine the availability of funds in an exchange account associated with the user. In step S4872, the exchange computer system can provide an electronic notification to one or more customer user devices that funds are available for use on the exchange.

Figure 7E:
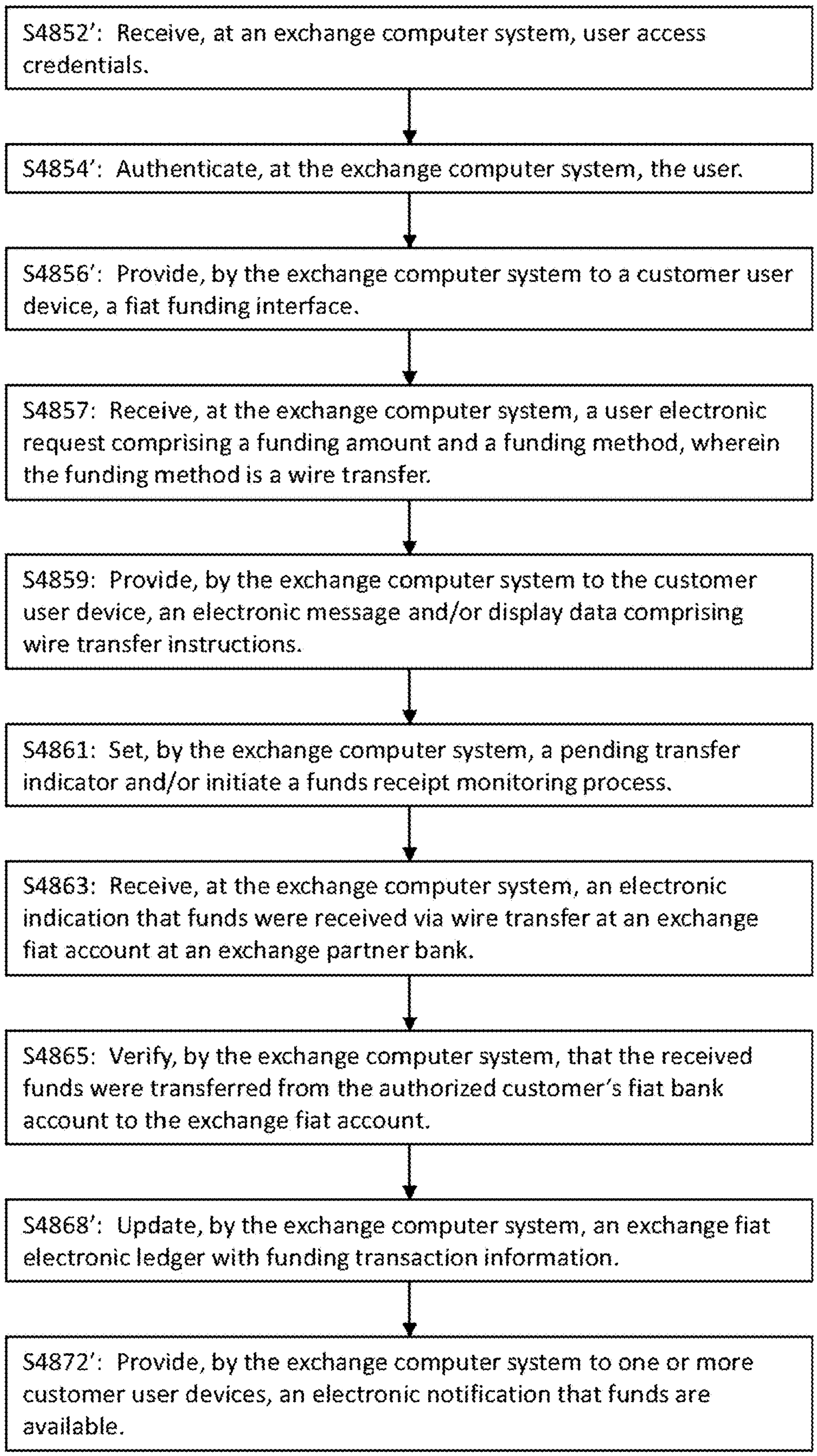

FIG. 7E is a flow chart showing another exemplary process for digital asset exchange customer account fiat funding. In step S4852', an exchange computer system can receive user access credentials. In step S4854', the exchange computer system can authenticate the user by verifying the received access credentials. Verifying the access credentials can comprise comparing the credentials to a secure credentials database. In step S4856', the exchange computer system can provide to a customer user device a fiat funding interface. In step S4857, the exchange computer system can receive a user electronic request comprising a funding amount and a funding method (e.g., a wire transfer). In step S4859, the exchange computer system can provide to the customer user device, an electronic message and/or display data comprising wire transfer instructions. In step S4861, the exchange computer system can set a pending transfer indicator and/or initiate a funds receipt monitoring process. In step S4863, the exchange computer system can receive an electronic indication that funds were received via wire transfer at an exchange fiat account at an exchange partner bank. In step S4865, the exchange computer system can verify that the received funds were transferred from the authorized customer's fiat bank account to the exchange fiat account. In step S4868', the exchange computer system can update an exchange fiat electronic ledger with the funding transaction information, which may include an amount value, customer account ID, transaction date and/or time, to name a few. In step S4870', the exchange computer system can monitor the exchange fiat account to determine the availability of funds in an exchange account associated with the user. In step S4872', the exchange computer system can provide an electronic notification to one or more customer user devices that funds are available for use on the exchange.

Figure 8A:
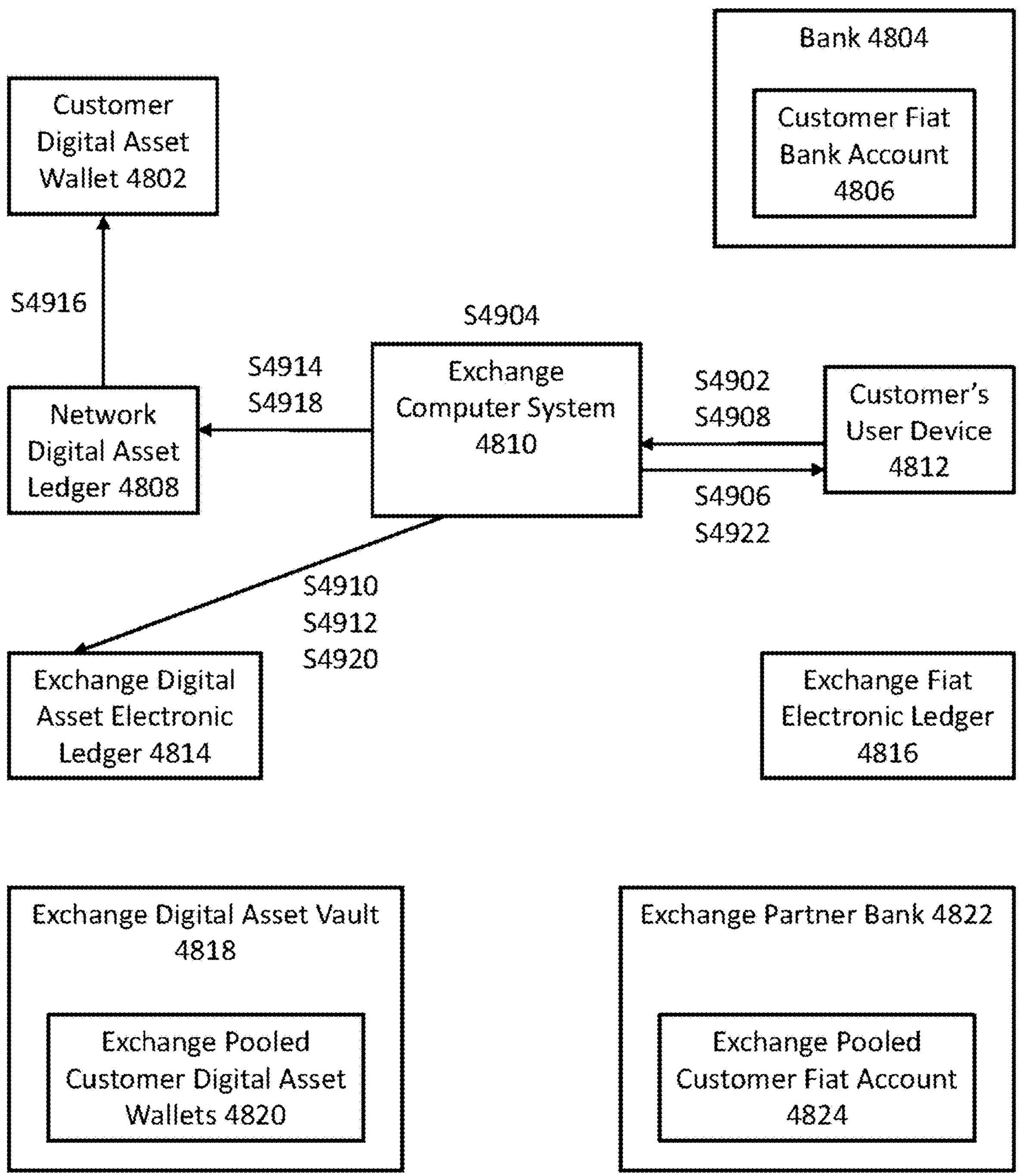
FIGS. 8A-8B are an exemplary schematic diagram and a corresponding flow chart of a process for digital asset exchange account digital asset withdrawal in accordance with exemplary embodiments of the present invention.
Figure 8B:
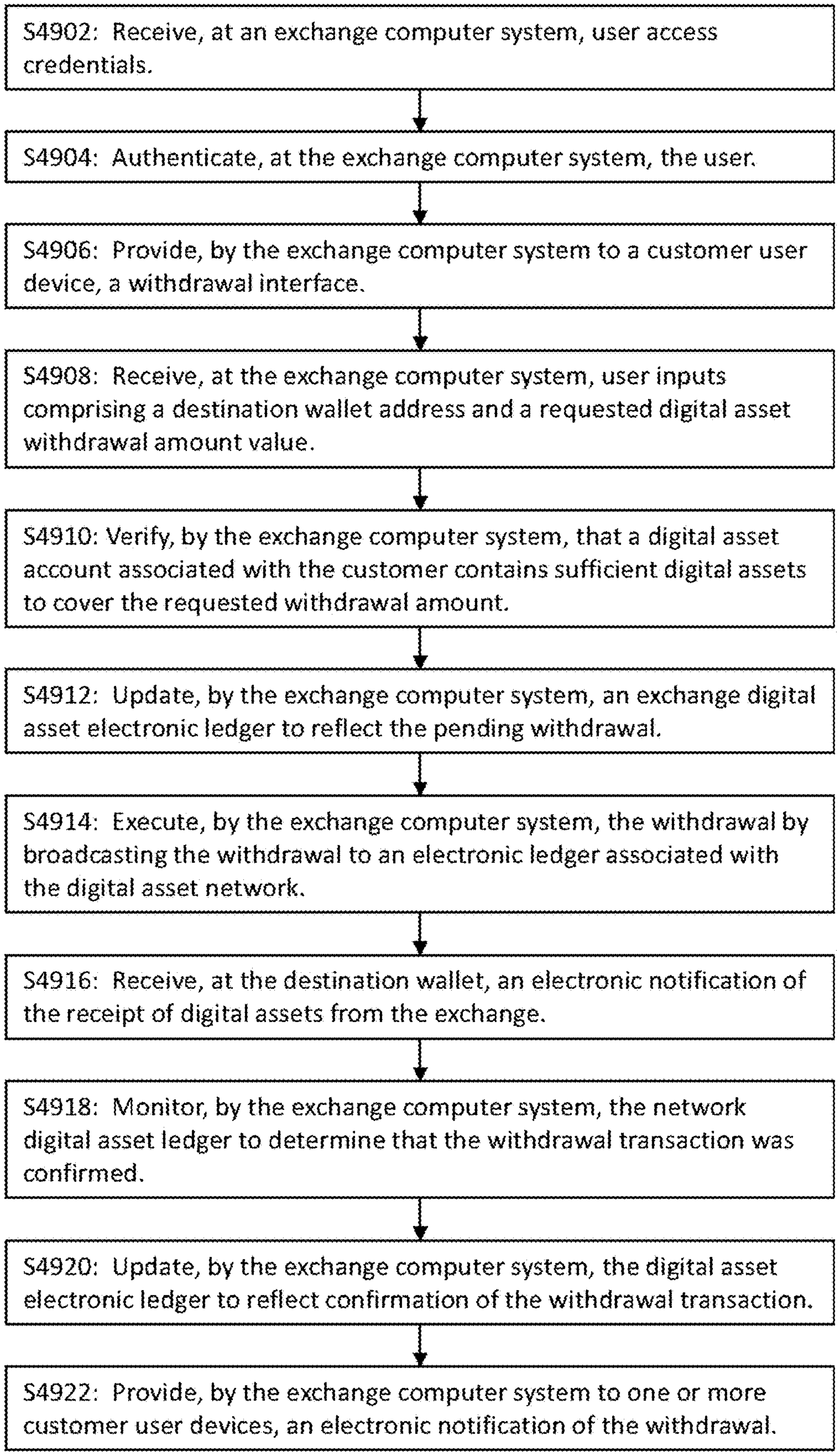

FIG. 8A is an exemplary schematic diagram of an exchange, and FIG. 8B is a corresponding flow chart of a process for digital asset exchange account digital asset withdrawal in accordance with exemplary embodiments of the present invention. The components and entities associated with an exchange that are shown in FIG. 8A are described herein with respect to FIG. 4A.

Referring to FIG. 8B, in step S4902, an exchange computer system can receive user access credentials. User access credentials can include any of a username, password, fingerprints, access card scan (e.g., swipe of a card associated with the exchange and having a magnetic strip), and/or a pin (e.g., a number provided via SMS, other text message service, or email for multi-factor authentication), to name a few. In step S4904, the exchange computer system can authenticate the user based upon the received user access credentials. In step S4906, the exchange computer system may provide to a customer user device a withdrawal interface. In step S4908, the exchange computer system may receive from the customer user device user inputs comprising at least a destination digital asset address, typically associated with a destination digital wallet and a requested digital asset withdrawal amount value. In step S4910, the exchange computer system may verify that a digital asset account associated with the customer contains sufficient digital assets to cover the requested withdrawal amount. In embodiments, such verification can comprise reading a digital asset electronic ledger and/or determining a customer digital asset balance, e.g., based on summing transactions recorded on a digital asset electronic ledger. In step S4912, the exchange computer system may update an exchange digital asset electronic ledger to reflect the pending withdrawal. In embodiments, recording an entry in the electronic ledger prior to the withdrawal may be performed to prevent double spending. In other embodiments, such a step may be skipped. In step S4914, the exchange computer system may execute the withdrawal, e.g., by broadcasting the withdrawal to a digital asset network electronic ledger, e.g., the BITCOIN Blockchain, the ETHEREUM Blockchain, to name a few. In step S4916, the destination wallet may receive an electronic notification of the receipt of digital assets from the exchange. In step S4918, the exchange computer system may monitor the network digital asset ledger to determine whether and/or when the withdrawal transaction is confirmed. In step S4920, the exchange computer system may update the digital asset electronic ledger, e.g., by debiting the withdrawal amount from the customer's exchange account, to reflect confirmation of the withdrawal transaction. In step S4922, the exchange computer system may provide to one or more customer user devices an electronic notification of the withdrawal. Such a notification can include at least the customer's new digital asset balance.

A digital asset exchange can include additional systems, which may include software modules, for performing various functions of the exchange. For example, an exchange can include an account management system, which may comprise a user account registration system for new users and/or an existing user account management system. The exchange can include a trading system, which may comprise an interactive trading interface system, an automated trading interface system, a trade confirmation notification system, and/or a trade transaction fee processing system. A fund transfer system can include a fiat account funding and redemption system, a digital asset accounting funding and redemption system, and an account funding and redemption fee processing system. An exchange can also include a trade settlement system. A customer service system can include a trade dispute resolution interface system and a customer account management assistance system. A customer reporting system can include a gain and loss reporting system and a transaction history system. A fraud analysis system can monitor transactions to detect fraudulent and/or unauthorized transactions. The exchange can also include a SVCoin system, which may comprise a purchase system, redemption system, and a dividend payment system. In a preferred embodiment, a SVCoin system is included to allow users to purchase and redeem stable value coins using fiat currency and/or other digital assets.

Exchange Digital Asset Storage Structure

Deposited customer fiat may be held in a pooled flat account maintained in a partner bank. Meanwhile, digital assets held by the exchange may be maintained in pooled digital addresses associated with pooled digital wallets. The exchange may store digital assets using any of the security and/or storage systems and methods discussed herein. The exchange can employ any combination of varying levels of secure storage for its wallets. For example, portions of digital assets held by the exchange may be maintained in cold storage with neither the wallet's private nor public keys ever having been exposed to a digital asset network or other external network, such as the Internet. Other digital assets may be stored in air-gapped hot wallets, which may be wallets generated off-line with transactions generated off-line, e.g., on an isolated computer, and transferred to a networked computer via a temporary physical connection or manual transfer. Other digital assets may be maintained in hot wallets, e.g., to satisfy withdrawals from the exchange. The exchange may determine the amount of assets to hold in hot wallets, which may be based on historical exchange activity and/or anticipated need. A hot wallet liquidity module may analyze and predict the amount of assets per wallet and/or during a time period required to meet anticipated need and may also initiate transfers of assets to or from hot wallets to maintain desired levels. For example, a hot wallet liquidity module could determine that it is desirable to maintain digital assets in certain defined amounts (e.g., 0.5 BITCOIN), and/or certain defined fiat amounts (e.g., $100 worth of BITCOIN) and/or of certain defined quantities sufficient to cover transactions anticipated during a defined period (e.g., the day's transaction). In embodiments, initiating an electronic transfer may comprise electronically generating and providing an electronic notification to devices associated with one or more exchange administrators of a need to transfer assets and/or an amount of assets to transfer. The exchange may designate one or more wallets for receiving incoming digital assets only. For example, the exchange may employ a single digital wallet for each receipt of digital assets, e.g., from exchange users. The receiving wallet may be destroyed after the received assets are transferred to one or more other wallets.

The exchange may employ any of a number of different exchange digital wallet systems. As discussed herein, the exchange may operate a pooled or omnibus digital wallet system, e.g., as part of a centralized exchange system. The pooled system may use an electronic ledger to track digital asset ownership for each exchange customer. Customers may transfer digital assets from their own digital wallets to an exchange address in order to fund their digital asset account on the exchange. The ledger can track (e.g., record) such funding events, as well as withdrawal events. Transfers of digital assets among customers can also be accounted for using the ledger. With a pooled wallet system, internal transactions on the exchange (e.g., transactions that do not entail transferring funds to or from the exchange or exchange wallets but rather transactions between exchange wallets) can be settled without delay, since the transfer can be logged through electronic ledger updates and does not have to otherwise be processed by a digital asset network.

In another embodiment, the exchange digital wallet system may comprise exchange operated wallets for each exchange customer. These exchange operated wallets may be maintained in trust by the exchange for each customer as associated digital asset addresses. Transactions may be processed by the digital asset network, e.g., the BITCOIN network, the ETHEREUM network, to name a few. The keys to each customer wallet may be held by the customer and/or by the exchange. Transactions may be settled via the digital asset network in real-time (with any corresponding confirmation period) as they occur, or transactions may be settled in a batch, which may entail broadcasting a plurality of transactions to the network at a particular time or periodically throughout a day.

In another embodiment of an exchange digital wallet system, the exchange customers may own and/or manage their own wallets, e.g., as part of a decentralized exchange system. The exchange would not hold any customer digital assets, and customers would hold the private keys to their wallets with associated digital asset addresses. The exchange may match customers, as described herein, so that a digital asset seller can transfer digital assets from the seller's digital wallet to a digital wallet corresponding to a digital asset buyer.

In embodiments, the digital wallet may be a custodial digital wallet. The custodial digital wallet may be segregated, that is, unique to a particular customer or commingled, including digital assets of multiple customers. In such an embodiment, the custodian holds digital assets in the custodial wallet for the benefit of its customers. The custodian would hold the private key or private keys/key segments to each custodial wallet whether it be segregated or commingled. Transactions may be made between different custodial wallets or between custodial wallets and exchange customer wallets in the manner described above.

Multi-Party Computation (MPC)

In embodiments, multi-party computation (e.g., secure computation, privacy-preserving computation), may include one or more processes for two or more parties to compute a function. In embodiments, the function may be computed by each party using a unique input. In embodiments, one or more unique inputs may be private. In embodiments, one or more of the unique inputs may be generated by one or more trusted third parties. In embodiments, at least a portion of each unique input may be the same or similar, which may, in embodiments, represent an association between one or more of the parties. In embodiments, utilizing unique inputs may improve the security and/or integrity of transactions, communication, and/or storage between two or more parties. In embodiments, a multi-party computation may conceal partial information about data while simultaneously computing with said data from two or more sources and accurately produce outputs.

One or more blockchains (e.g., blockchain 6803), in embodiments, may be based on public key infrastructure (PKI). For example, a user's identity may be determined by a set of digits representing a public key. A public key, in embodiments, may be mathematically related to a private key—the two of which may be referred to as a key set. In embodiments, a public key may correspond to a public address on a blockchain network. In embodiments, a transaction published on the blockchain is valid if the transaction includes a private key associated with the originating public address (and corresponding public key). In embodiments, a message published on the blockchain may be valid if the message includes a private key associated with the originating public address.

A multi-party computation, in embodiments, may generate a public key associated with two or more parties and/or enable two or more parties to individually and/or together sign transaction requests and/or messages originating from, or addressed to a public address associated with the two or more parties. For example, the public key may be collectively derived using a multi-party computation based on individual fragments which may be separately generated by multiple, non-trusting computers. In embodiments, the multi-party computation may result in the distribution of the signature methods (e.g., a fragment used to sign transactions) such that each party's respective signature method is kept separate and/or secret from the remaining party's respective signature method. For example, the "private key" associated with the generated public key may be a collectively generated value based on fragments from each party. As such, in embodiments, multiple non-trusting computers can each conduct computation on their own unique fragments of a larger data set to collectively produce a desired common outcome without any one node knowing the details of the others' fragments. As another example, a transaction requiring a multi-party computation may require only a portion of the parities to sign. For example, the multi-party computation may include 5 parties. Continuing the example each transaction request that is digitally signed via the multi-party computation may only require 3 of the 5 parties to sign.

In embodiments, an administrator (e.g., digital asset exchange 6110, digital asset exchange computer system 6102, to name a few), may be associated with one or more public keys generated by one or more multi-party computations. For example, the digital asset exchange 6110 may have generated ten (10) multi-party public keys each associated with a separate public address on the blockchain 6108. Continuing the example, each of the ten multi-party keys may have been separately generated with a multi-party computation based on a unique input from the digital asset exchange 6110 and a respective group of one or more users. Each respective group of one or more users, in embodiments, may have different users and/or overlapping users. Referring to the example, the administrator (digital asset exchange 6110 in the example), may utilize the same unique identifier for each multi-party computation. In embodiments, the administrator may utilize one or more unique identifiers as inputs to multi-party computations. In embodiments, the administrator and/or a custodian may hold the unique identifiers for one or more parties associated with a multi-party transaction. In embodiments, the unique fragments resulting from the multi-party transaction, for each party to a multi-party transaction, may be dispersed to one or more accounts associated with one or more of the following: the respective user, a custodian, the administrator (e.g., digital asset exchange 6110, digital asset exchange computer system 6102, to name a few), a party associated the respective user, and/or a combination thereof, to name a few. In embodiments, the unique fragments resulting from the multi-party transaction, for each party to a multi-party message and/or single-party message, may be dispersed to one or more accounts associated with one or more of the following: the respective user, a custodian, the administrator (e.g., digital asset exchange 6110, digital asset exchange computer system 6102, to name a few), a party associated the respective user, and/or a combination thereof, to name a few.

A multi-party computation, in embodiments, may increase the security of transactions and/or messages sent between two or more parties. In embodiments, multi-party computations may be a fast and secure transaction, as compared to the speed and/or security of transactions involving offline key-sets. For example, multi-party computations may enable custodians of digital assets to perform Regulatory Administration Platform for Insurance Data (RAPID) transactions. As another example, multi-party computations may enable custodians of digital assets to engage in Service Level Agreements. The security of transactions and/or messages, in embodiments, may be enhanced using encryption. For example, a message and/or transaction, when sent by a first user to the administrator, may be encrypted using Rivest, Shamir, & Aldeman (RSA) algorithm(s). As another example, a message and/or transaction, when published to the blockchain, may be encrypted using Twofish algorithm(s). In embodiments, messages and/or transactions sent between one or more parties and/or published to the blockchain may be encrypted in accordance with one or more of encryption algorithm(s), such as: Triple Data Encryption Standard (DES), RSA, Blowfish, Twofish, Advanced Encryption Standard (AES), and/or a combination thereof, to name a few. Further, messages and/or transactions sent between one or more parties and/or published to the blockchain may be encrypted, which may include one or more of the following techniques: character substitution, scrambling, mapping, hashing, and/or a combination thereof, to name a few. In embodiments, symmetric and or asymmetric encryption algorithms may be applied.

For example, one or more transactions and/or messages may be encrypted and/or decrypted by using and/or applying a cryptographic hash function of one or more of: the one or more messages, the one or more transactions, the public key(s) associated with the one or more messages and/or transactions, the private key(s) associated with the one or more messages and/or transactions, and/or a combination thereof, to name a few. A cryptographic hash function may be a hash function that is a mathematical algorithm which maps data of arbitrary size to a bit string of a fixed size (e.g., a hash). In embodiments, the cryptographic hash function may be designed to be a one-way function (e.g., a function that is infeasible to invert). The cryptographic hash function, may include one or more of the following prosperities: (1) deterministic such that the same message produces results in the same hash; (2) high speed, such that the hash value for a message is computed in a manner that does not slow the process down; (3) infeasible to generate a message from the hash, such that generating a message from the hash value would require attempting all possibilities (e.g., a brute force approach); and (4) unique, such that messages to not have the same hash value and/or small changes to a message alter the hash value such that the values do not correlate, to name a few.

As referred to herein, a public key may be similar to one or more of the following, the descriptions of each applying herein: the corresponding public key of the on-line key set 1364; and/or one or more of the public keys described in connection with FIGS. 14A-14G, 20A-20B, 21A-21B, 32A-32B, and/or 40A-45, to name a few, to name a few.

Decentralized Digital Asset Exchange

FIGS. 81A-B are a schematic diagram and corresponding flow chart showing participants in and processes for a digital asset exchange system in accordance with exemplary embodiments of the present invention. A digital asset exchange may provide conversions among digital math-based assets and fiat currencies. In embodiments, conversions may be performed between differently denominated digital math-based assets. In embodiments, a digital asset exchange may facilitate the buying and selling of digital assets in exchange for other digital assets, non-digital assets, fiat currencies, or other financial instruments. The parties to such a transaction may be individuals, organizations, and or institutions. In embodiments, the exchange itself or its operator or owner may be the counter-party to an exchange transaction.

FIG. 81B is a flow chart corresponding to the digital asset exchange system illustrated in FIG. 81A. In a step S3150, one or more exchange computers comprising an exchange computer system may receive from a digital asset buyer acceptances of transaction terms comprising a digital asset price and a quantity of digital assets.

In a step S3152, the exchange computer system may receive from the digital asset buyer authorization to transfer funds from the digital asset buyer's account in an amount based at least in part upon the accepted digital asset price.

In a step S3156, the exchange computer system may receive from a bank, a notification of funds transferred to an exchange bank account from the digital asset buyer.

In a step S3158, the exchange computer system may provide to a digital asset seller a notification of funds transferred to the exchange bank account from the digital asset buyer.

In a step S3160, the exchange computer system may provide to a digital asset seller, an instruction to transfer digital assets to a digital wallet associated with the seller in an amount based at least in part upon the accepted digital asset quantity. In embodiments, the digital asset seller may transfer digital assets to a digital wallet associated with (e.g., owned by and/or operated by) the exchange. The exchange may hold such funds in escrow until the buyer's payment is received, e.g., into a bank account (for fiat currencies) or into a digital wallet (for other digital assets).

In a step S3164, the exchange computer system may receive from the digital asset buyer a notification of received digital assets from the digital asset seller.

In a step S3166, the exchange computer system may provide to the bank, an instruction to release the digital asset buyer's funds to the digital asset seller.

In another embodiment, the exchange can act as a counter-party to transactions where digital assets are bought and/or sold for a differently denominated digital asset or a fiat currency. In embodiments, the system illustrated in FIG. 81A can be used to perform exchange transactions with multiple counter-parties. An exchange computer system may identify a digital asset seller and a plurality of buyers. The exchange computer system may determine, obtain, or receive (e.g., from computers, digital asset kiosks, or user electronic devices associated with the buyers) public addresses of digital asset wallets associated with the buyers. The exchange computer system may also determine, obtain, or receive digital wallet information (e.g., public address, public key, and/or private key) associated with the seller. In embodiments, wallet information of any exchange participant may be stored by the exchange computer system in one or more databases, which may be accessed as part of a transaction. A participant in an exchange transaction may also input (e.g., via downloadable software or a website associated with the exchange) and/or otherwise transmit to the exchange required digital wallet information from which to send or in which to receive digital assets. The exchange computer system may use the digital wallet information of the exchange transaction participants to generate transaction instructions. For example, the exchange computer system may pre-program instructions to transfer a certain amount of digital assets from the seller wallet to each buyer wallet. The exchange computer system may also input the digital wallet access credentials (e.g., a public and private key) so that the transaction may proceed.

Generation of Digital Asset Exchange Graphical User Interfaces

The particular systems, methods, and program products of embodiments of the present invention that generate graphical user interface (GUI) provide a solution to electronic order book data visualization problems. The potential for large numbers of orders in an electronic order book creates a technical data visualization problem, whereby it can be difficult for a user (e.g., a trader) to determine how a particular order or prospective order will impact the market or the market within a particular digital asset exchange system or how a particular order will be fulfilled based upon pending orders in a current order book. Embodiments of the present invention provide electronic order book visualization interfaces that include a representation of a prospective order defined by order parameters, which may be edited by the user. Upon editing prospective order parameters, the prospective order graphical representation may be updated to reflect the new parameters. These interfaces can provide a user with an intuitive depiction of both the current market and the effect of the prospective order on the market. The interfaces can also show how a prospective order may be fulfilled, not fulfilled, and/or the degree to which a prospective order will likely be fulfilled based on the current electronic order book. The interfaces also provide an unconventional visualization that can facilitate faster comprehension of the bounds of order book data (e.g., order prices and corresponding order volumes).

Figure 121A:
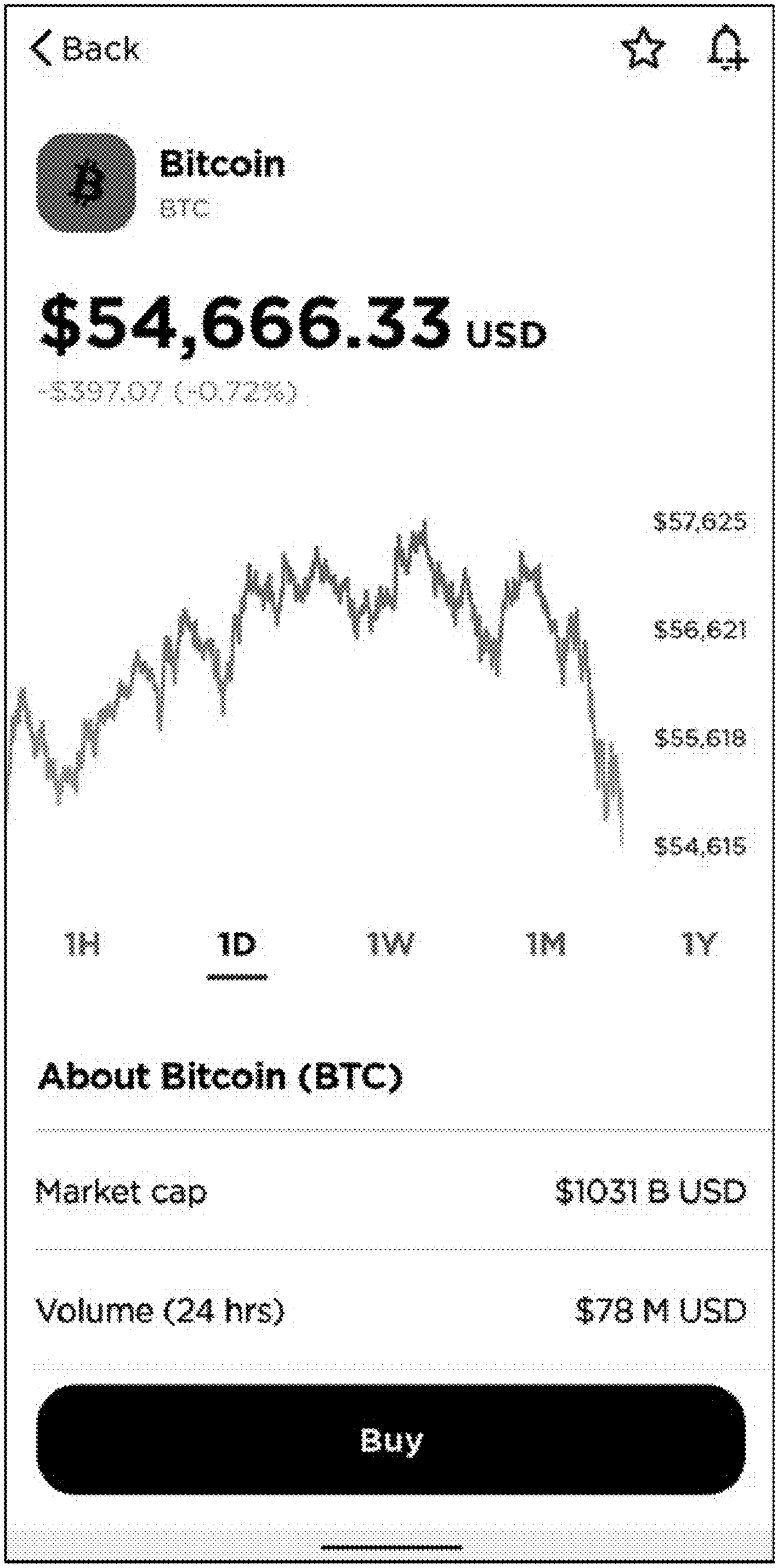
Figure 121B:
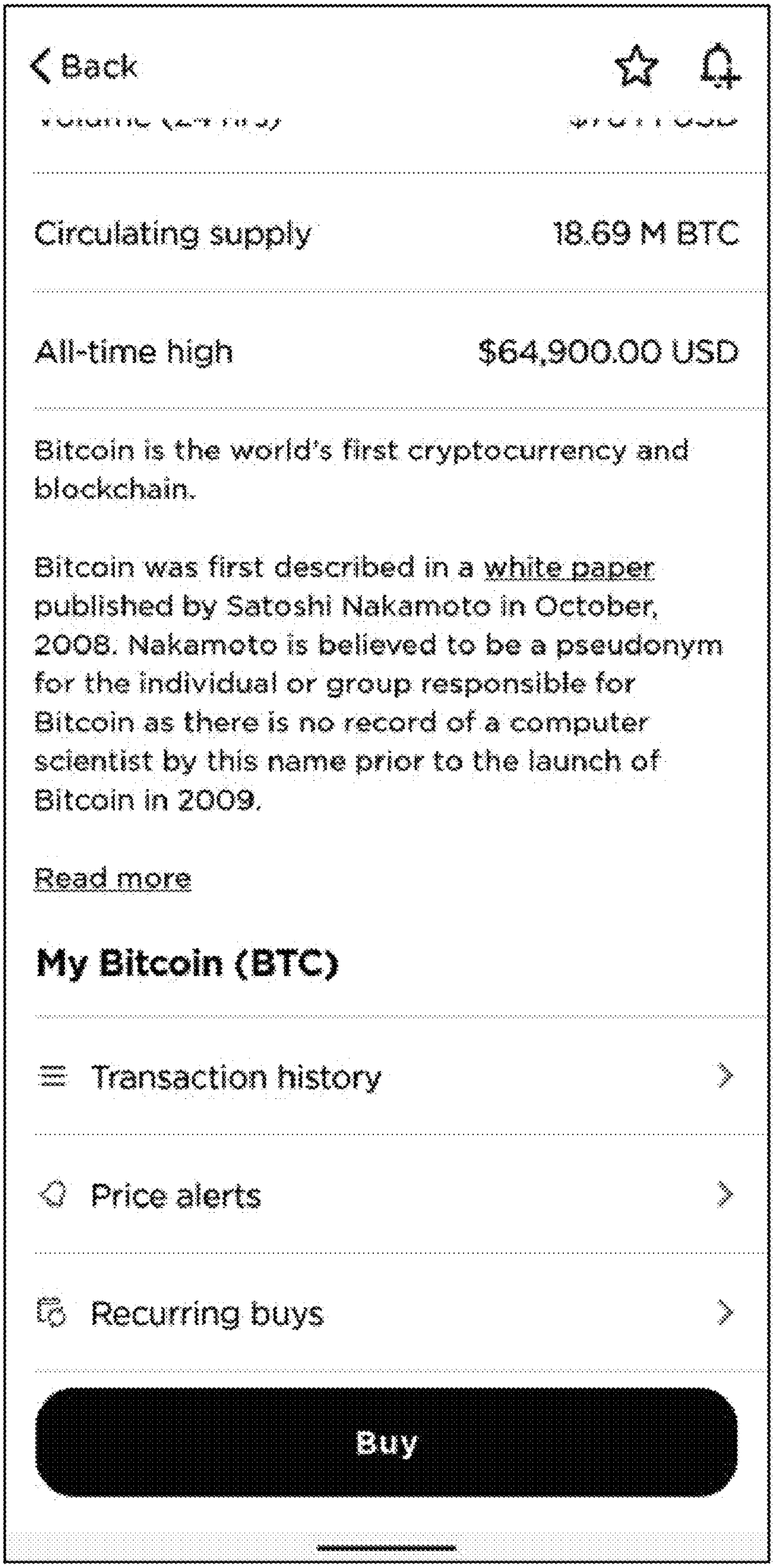
Figure 121C:
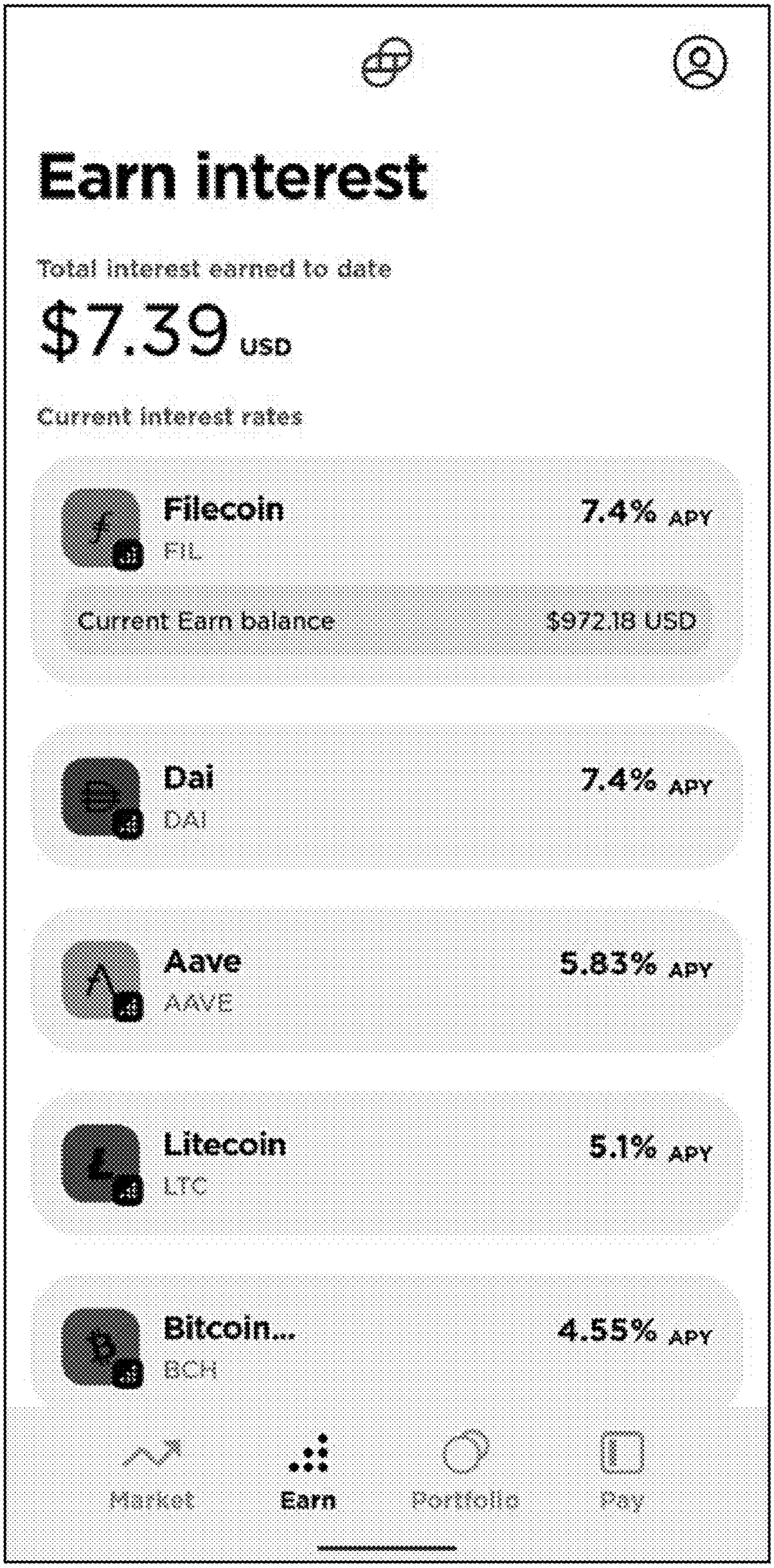
Figure 121D:
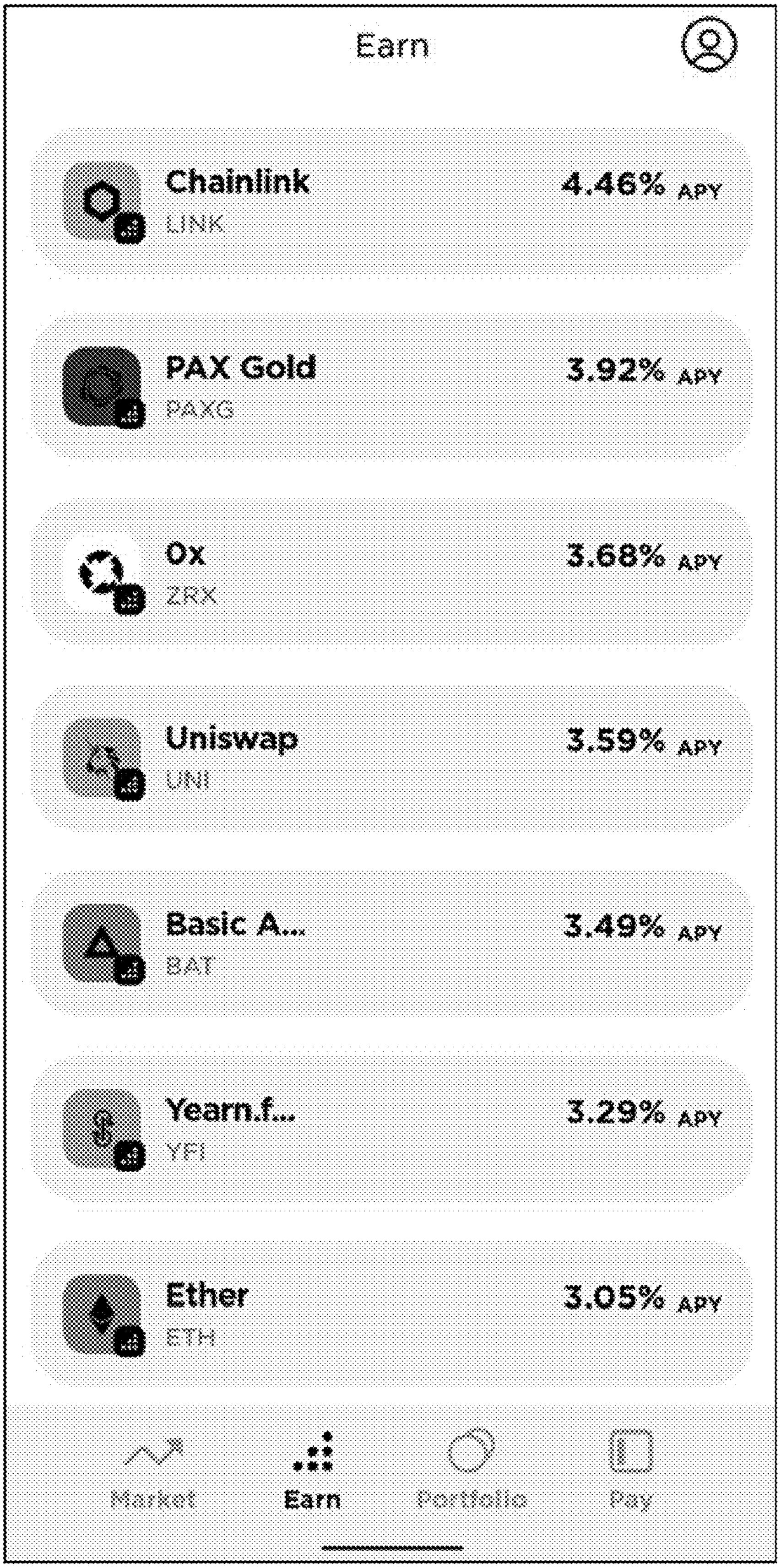
Figure 121E:
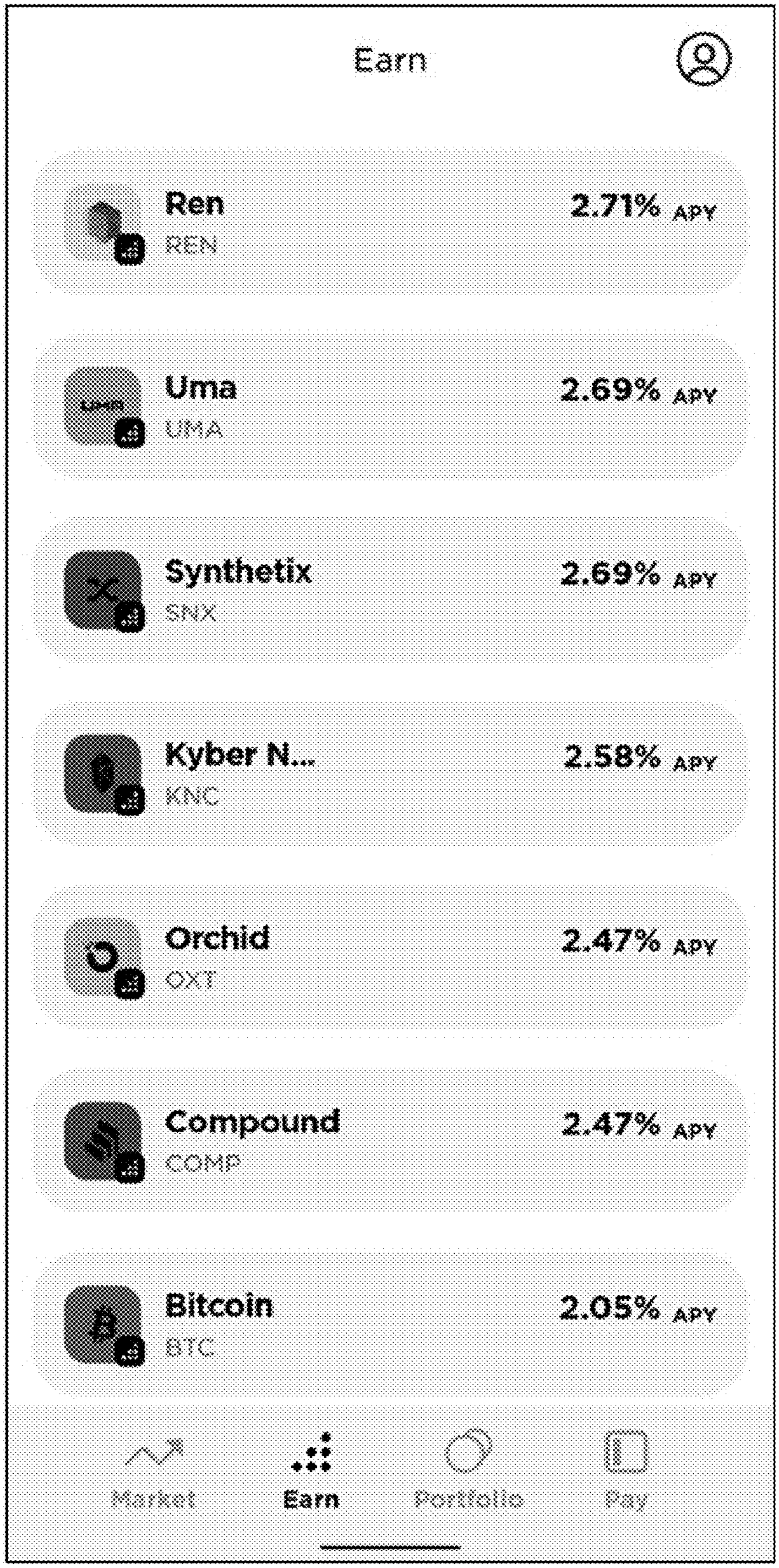
Figure 121F:
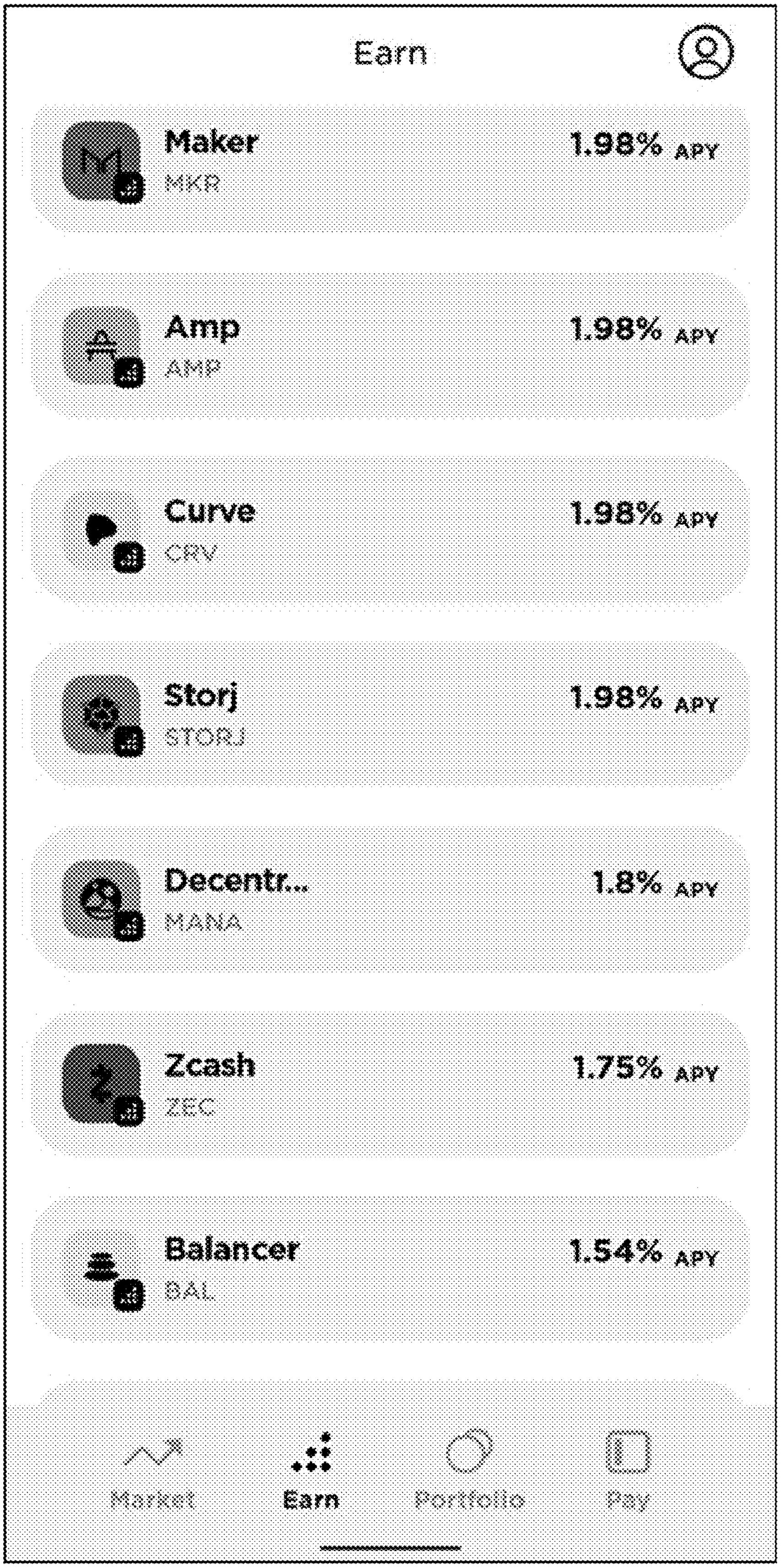
Figure 121G:
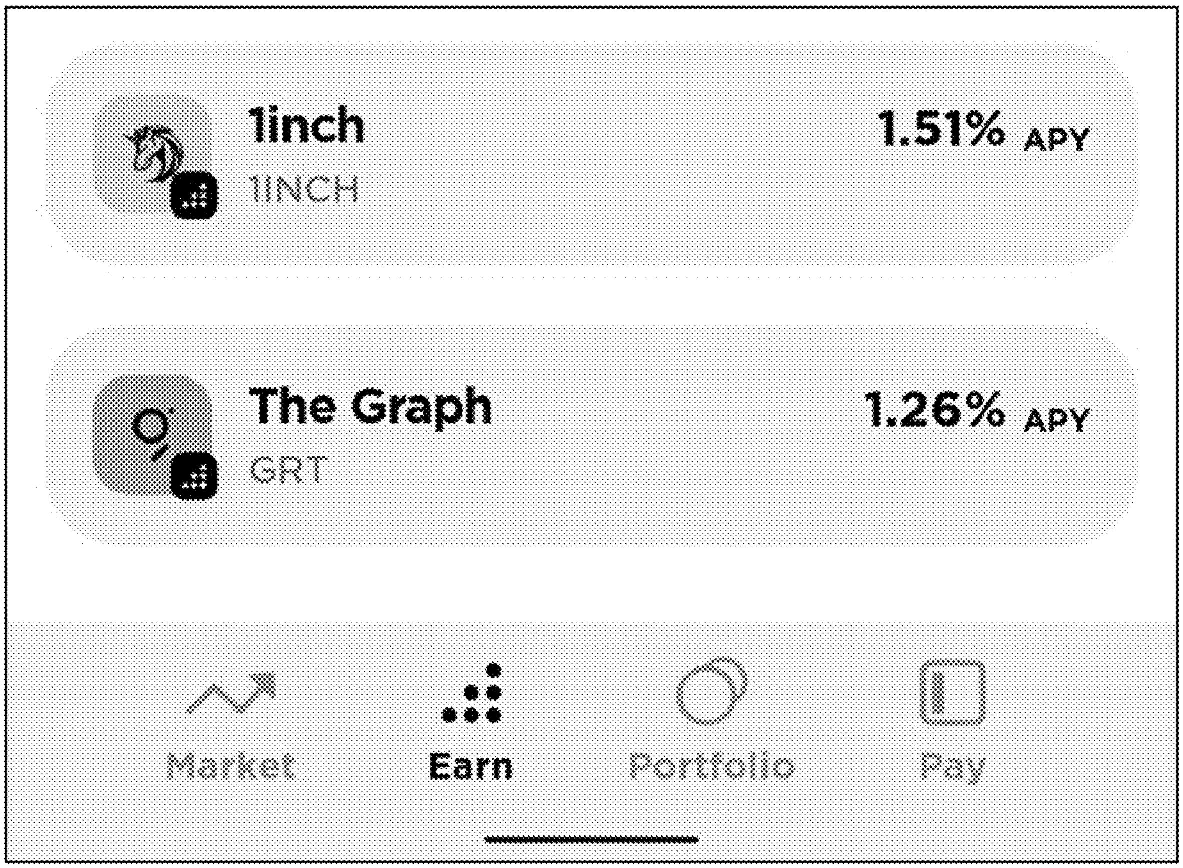

FIGS. 121A-G are exemplary screen shots of graphical user interfaces generated and/or provided by a digital asset exchange computer system. FIG. 121A, in embodiments, is an exemplary screenshot of a mobile phone application regarding the purchasing and/or tracking of a digital asset. FIG. 121B, in embodiments, is an exemplary screenshot of a mobile phone application regarding the purchasing and/or description of a digital asset. FIGS. 121C, 121D, 121E, 121D, and 121G, in embodiments, are exemplary screenshots of a mobile phone application regarding digital asset decentralized financial products.

FIGS. 82A-L are exemplary screen shots of graphical user interfaces generated and/or provided by an exchange computer system. In embodiments, the exchange computer system may transmit display data to user devices, which can comprise machine-readable instructions to render such user interfaces. User interfaces may be based at least in part upon user activity (transaction histories, order information, such as potential order parameters, actual order parameters, order fulfillment data, order dates and/or times, to name a few) and/or market activity (e.g., prices, historical prices, price movements, high and/or low prices within a time period, transaction volume, order book information, to name a few, either globally or on one or more particular digital asset exchanges). The exchange computer system may track such data, compute such data, generate such data, and/or obtain such data (e.g., via one or more application programming interfaces (APIs)). Data for generating a user interface may be stored in non-transitory computer-readable memory operatively connected to the exchange computer system. The exchange computer system may process logical rules governing user interface content and/or layout to generate display data and/or instructions for rendering an interface at a user electronic device. Such data and/or instructions may be transmitted to the user device, which may render the interface. In embodiments, the user device may execute the machine-readable instructions to render the interface, which may be a dynamic interface that changes in response to user inputs and/or receipt of updated data values.

Figure 82A:
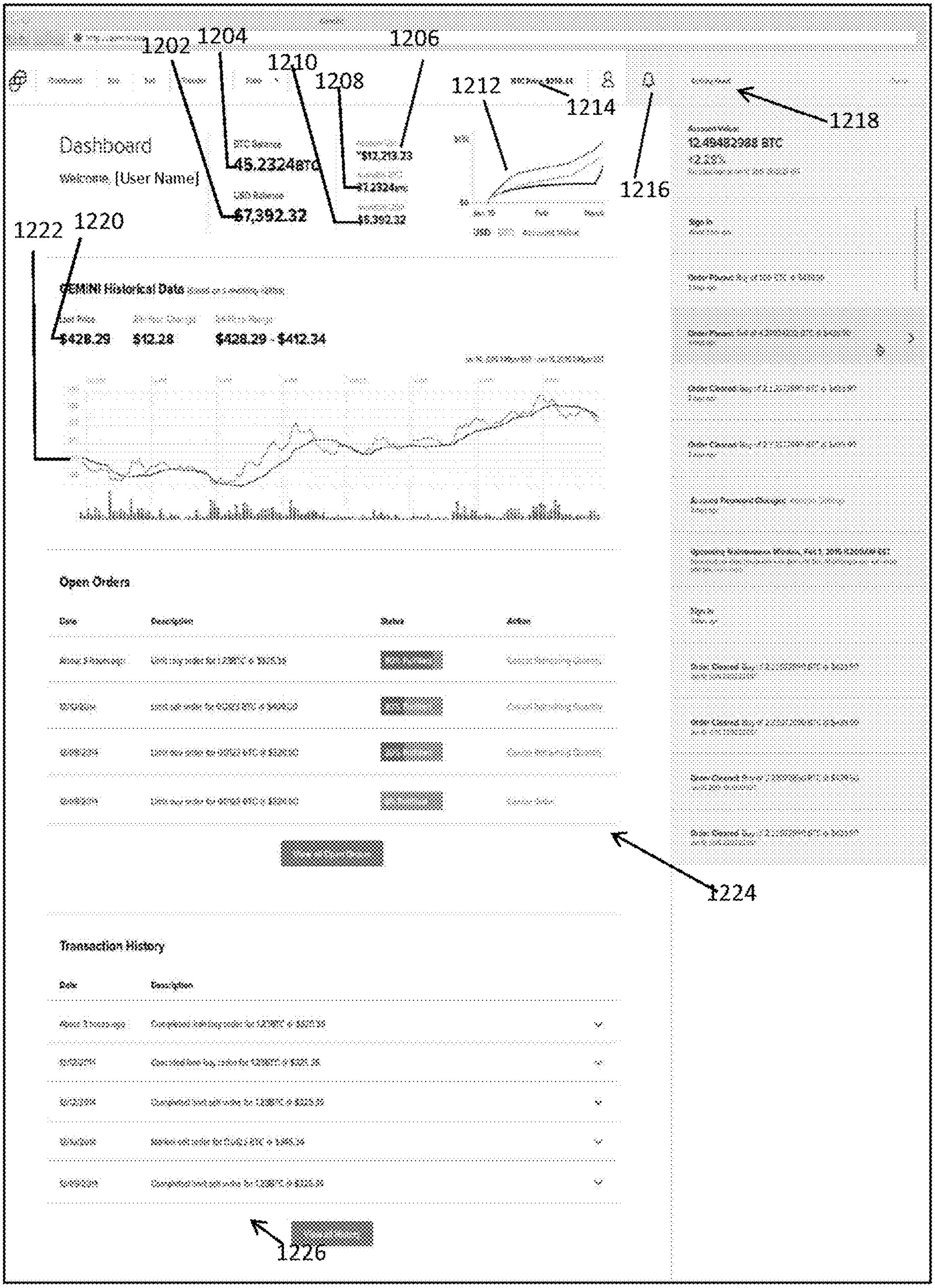

Turning to FIG. 82A, a screenshot of a GUI for use with a digital asset exchange according to exemplary embodiments described herein is illustrated. The GUI may comprise a dashboard, which may present an overview of user activity (e.g., for a particular user or user account), exchange-wide activity, and/or broader market activity (e.g., based upon one or more exchanges or based upon a digital asset index, to name a few). For example, a current digital asset price 1214 may be displayed. Such price may be the market price based on the electronic order book of the digital asset exchange. In embodiments, such current digital asset price 1214 may be based upon one or more other exchanges and/or digital asset indices, which may provide a blended price (e.g., weighted by transaction volume at each price).

The dashboard GUI may present various information associated with a digital asset exchange, for example, balance information (including fiat currency balances 1202 and/or digital asset balances 1204), account value information (including present, past, and/or predicted values), historical trends, open orders, past orders, and/or user history, to name a few. Accordingly, such a dashboard interface may include account summary information, such as one or more digital asset balances 1204 and/or fiat currency (e.g., U.S. Dollar) balances 1202 associated with a particular user account or master account, which may be an umbrella account with a plurality of user sub-accounts. The dashboard interface may also include an account value 1206, which may be a sum of all digital asset balances and fiat currency balances. In embodiments, the account value may be expressed in digital asset quantities and/or in fiat currency amounts. Accordingly, the exchange computer system may estimate a conversion amount either from a digital asset balance to a fiat currency value or from a fiat currency balance to a digital asset value, which conversions may be based upon order book information for the exchange and/or a digital asset index, such as a current market price. The dashboard interface may also indicate values for available digital assets 1208 and available fiat currencies 1210 associated with a user account. Amounts available may be based upon account balances and pending orders, such as by subtracting pending digital asset purchase order amounts from a fiat currency balance of a user's fiat currency account associated with (e.g., held in custody by) the exchange or subtracting pending digital asset sale order amounts from a digital asset balance of a user's digital asset account associated with (e.g., held in custody by) the exchange. One or more graphs 1212 illustrating account balances and/or total account value, in digital asset amounts or fiat currency amounts, may be provided in the interface. In embodiments, graphs showing each account balance and a total account value may be overlaid on each other.

A dashboard GUI may include options to access different data. Such options may comprise graphical buttons, hyperlinks, text, and/or icons, to name a few. The GUI can include a user account data selection option, settings selection option, and/or a notification selection option 1216, selection of any of which may cause the digital asset exchange computer system to provide respective data, menus, and/or updated GUIs. For example, a notification selection option 1216 may be used to access a notifications menu or notifications listing.

A dashboard GUI may further include exchange historical data 1220, such as a last price (e.g., price for the most recent executed transaction), a 24-hour change (e.g., a delta between the market price 24 hours prior and the current market price), price deltas over different time ranges (e.g., 30 minutes, 1 hour, 12 hours, 1 week, 1 month, 3 months, 1 year, 5 years, to name a few), a 24-hour range (e.g., showing the lowest and highest prices during the interval), and/or price ranges within other time ranges, to name a few. The dashboard GUI may also include a historical price and/or historical volume graph 1222. The graph may show exchange transaction prices over time and/or corresponding exchange transaction volumes over time. The graph may show transaction data from one or more other digital asset exchanges and/or digital asset indices. Any of this data may be overlaid on the graph. For example, digital asset index data may be overlaid on exchange transaction data.

A dashboard GUI may include an open orders listing 1224 showing open orders associated with an exchange user account. An open orders listing 1224 may indicate the date, time, and/or approximate time (e.g., about 3 hours ago) at which each order was placed. The listing 1224 may include a description of the order, e.g., order type, such as market or limit, purchase or sell, and/or order parameters, such as digital asset quantity, order price, limit order price, and/or total fiat currency amount. The listing 1224 may include an order status indicator, which may comprise a graphical indication, such as a status bar, of the degree to which each order is filled and/or text indicating the same (e.g., a percentage). The order listing 1224 may also include action options, selection of which may cause the exchange computer system to perform an action, such as canceling an order or canceling the remaining unfulfilled portion of an order. A truncated open order listing 1224 may be presented, which may include an option to view more or view all open orders.

A dashboard GUI may include a transaction history listing 1226. A transaction history may list some or all transactions associated with an exchange user account. A transaction history listing 1226 may indicate the date, time, and/or approximate time (e.g., about 3 hours ago) of each transaction and/or a description of the transaction (e.g., order type and/or order parameters, final order status, such as completed or canceled). In embodiments, the transaction history listing 1226 may include one or more options to display additional information (e.g., order details) for each transaction. A truncated transaction history listing may be provided, which may include an option to display more or all transactions (e.g., a view all history button).

A dashboard GUI may include an activity feed 1218 that displays summary information describing transactions, other actions (e.g., account funding), notifications, market activity, and/or exchange activity, to name a few. An activity feed 1218 may be accessed via a notification selection option 1216. Activity feeds are discussed herein with respect to FIGS. 82K-L.

Figure 82B:
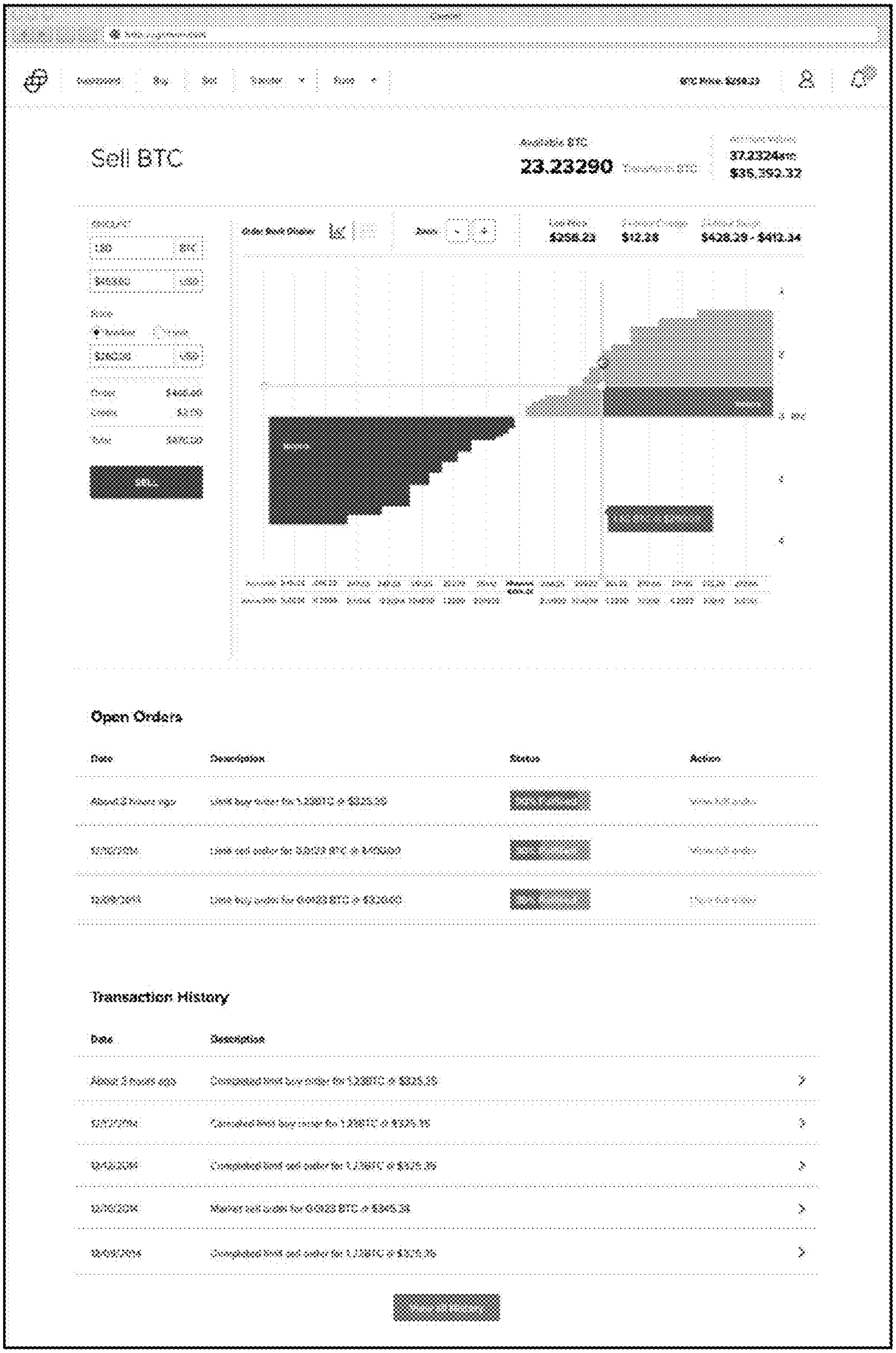

Referring to FIG. 82B, a screenshot of a GUI for use with selling a quantity of digital assets on a digital asset exchange according to exemplary embodiments described herein is illustrated. The GUI shown may present various information associated with selling digital assets on a digital asset exchange, for example, balance information (including digital currency and real-world currency), account value information (including present, past, and/or predicted values), historical trends (such as asset pricing), open orders, past orders, and/or user history, to name a few. The GUI shown may include one or more input fields through which a user can input order parameters for a prospective sell order. Such order parameters can include a desired digital asset amount (e.g., a quantity of BITCOIN) to sell, a total fiat amount to be sold (which may be a total digital asset value to be sold denominated in a flat currency, such as USD), a digital asset price (e.g., a fiat currency amount corresponding to a single unit of digital assets), and/or an order type (e.g., market order, limit order). As shown, a user may designate a value of a digital asset to be sold based upon a market price determined by past and/or current sales of digital assets across a digital asset exchange.

The GUI may include a graphical representation of the order book and the prospective sell order. In embodiments, a first axis, such as the horizontal axis, may show price, and a second axis, such as a vertical axis, may show digital asset quantity. Digital asset quantity may increase in both directions moving away from the price axis. Sell orders may be shown on a first side of the price axis (e.g., above the price axis), while buy orders may be shown on a second side of the price axis (e.g., below the price axis). Accordingly, all pending digital asset sell and purchase orders from the electronic order book may be shown. In embodiments, less than all order may be shown based on the display bounds for one or both axes. A prospective sell order graphical representation may show the digital asset quantity for sale at each price at which it is for sale (e.g., the sell price and higher prices). Such a representation is evident in the dark portion in the upper right quadrant of the graph with respect to the price axis and the digital asset quantity axis taken at the spread point (this dark portion is the bottom right quadrant with respect to the prospective order crosshairs). The prospective sell order graphical representation may also show which pending buy orders from the order book will satisfy the sell order and/or how the sell order, once executed, will modify the existing order book. This can be seen as the dark portion in the lower left quadrant of the graph. A graphical indicator of one or more order parameters (e.g., digital asset quantity and price) may be overlaid on the graph, e.g., near the crosshairs. The exemplary GUI shows a prospective sell limit order with a limit order price above the market price. Accordingly, the order will not be satisfied by the pending purchase orders.

Figure 82C:
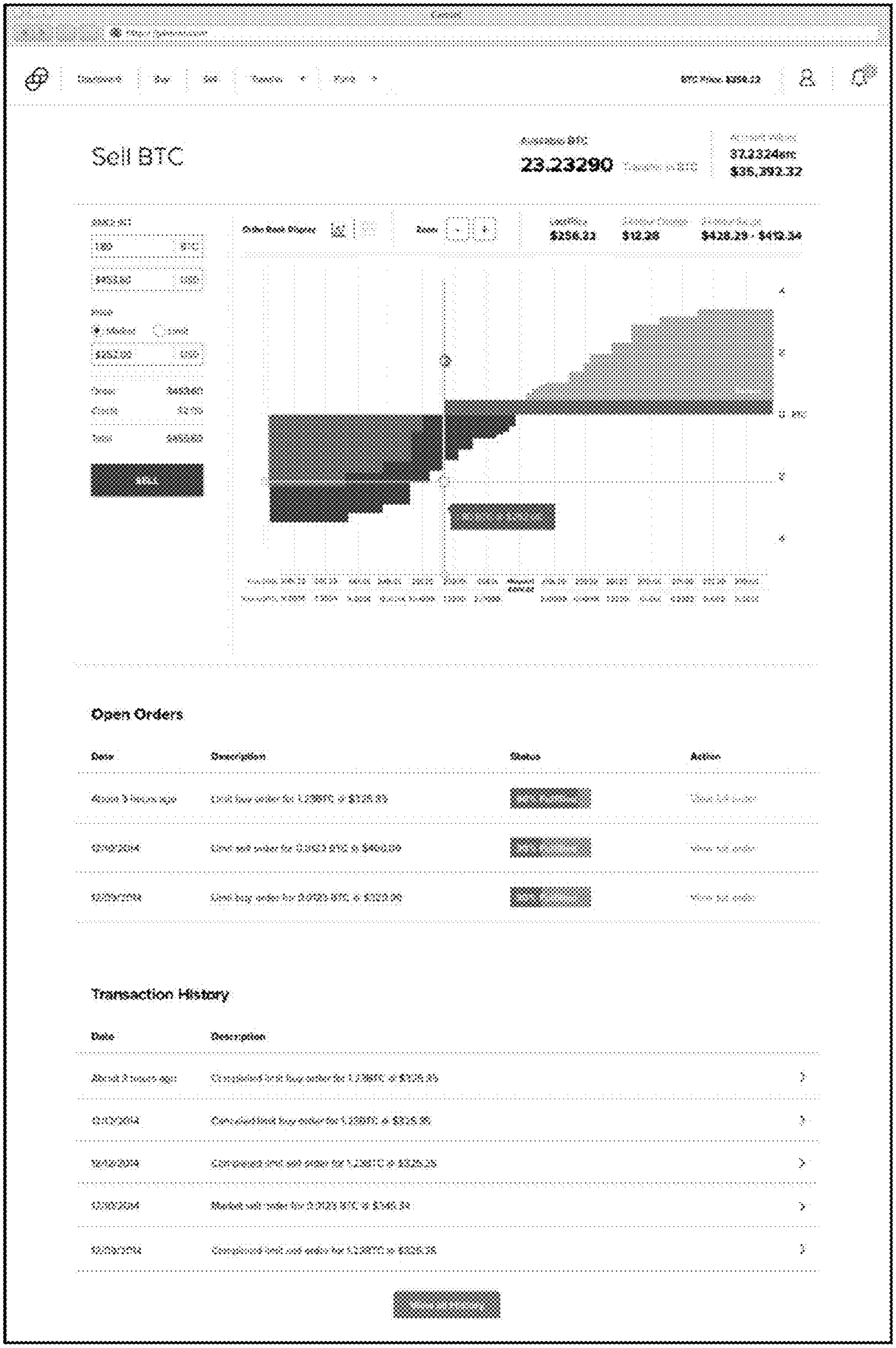

Turning to FIG. 82C, a screenshot of a GUI for use with a digital asset exchange according to exemplary embodiments described herein is illustrated. The GUI shown may present various information associated with selling digital assets on a digital asset exchange, for example, balance information (including digital currency and real-world currency), account value information (including present, past, and/or predicted values), historical trends (such as asset pricing), open orders, past orders, and/or user history, to name a few. The GUI shown may include one or more input fields through which a user can input information such as a desired amount or value of digital assets to be sold. As shown, a user may designate a value of a digital asset to be sold based upon a price determined by past and/or current purchases of digital assets across a digital asset exchange. The exemplary GUI shows a sell limit order with an order price lower than the market price. Accordingly, at least a portion of the sell limit order will be fulfilled by the pending purchase orders. The upper right quadrant of the graph shows the sell order book. The light colored order book graphical representation may indicate the cumulative volumes at each price that are subject to pending sell orders. In embodiments, it may also include the volumes from the prospective sell order. The dark region in the upper right quadrant may indicate the order volume and order prices (e.g., the sell order limit price and any prices above it). In embodiments, the dark region may only show the portion of the prospective sell order that will be unfulfilled by the pending purchase orders.

Figure 82D:
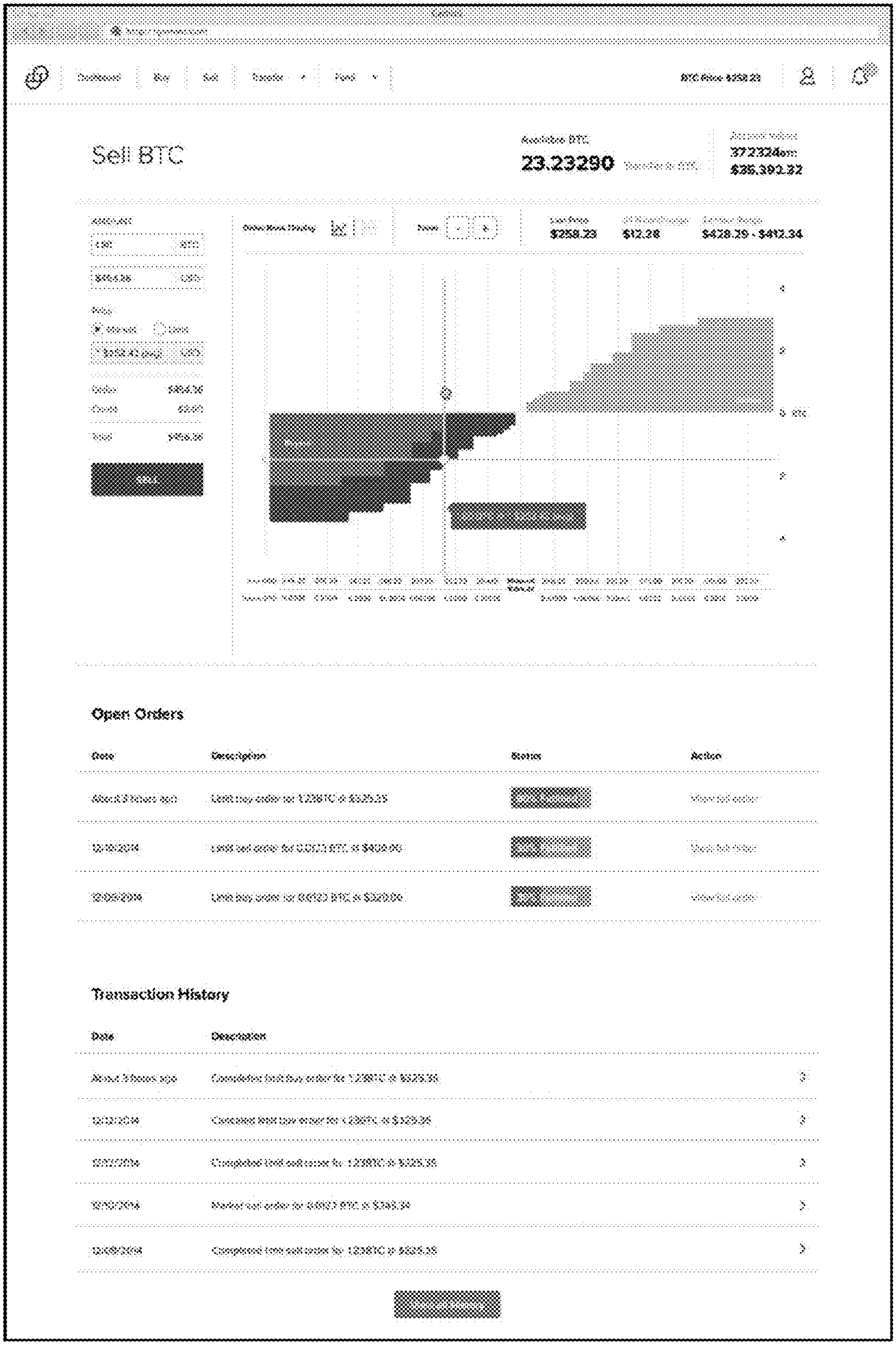

Turning to FIG. 82D, a screenshot of a GUI for use with a digital asset exchange according to exemplary embodiments described herein is illustrated. The GUI shown may present various information associated with selling digital assets on a digital asset exchange, for example, balance information (including digital currency and real-world currency), account value information (including present, past, and/or predicted values), historical trends (such as asset pricing), open orders, past orders, and/or user history, to name a few. The GUI shown may include one or more input fields through which a user can input information such as a desired amount or value of digital assets to be sold. As shown, a user may designate a value of a digital asset to be sold based upon a past and/or current averaged market value of digital assets traded across a digital asset exchange. The exemplary GUI shows a market sell order. The exchange computer system may execute the order at a current market price. In embodiments, the exchange computer system may place a plurality of market orders to satisfy the order (e.g., until the specified digital asset order quantity is reached and/or until the specified total cost is reached).

Figure 82E:

Referring to FIG. 82E, a screenshot of a GUI for use with a digital asset exchange according to exemplary embodiments described herein is illustrated. The GUI shown may present various information associated with purchasing digital assets on a digital asset exchange, for example, balance information (including digital currency and real-world currency), account value information (including present, past, and/or predicted values), historical trends (such as asset pricing), open orders, past orders, and/or user history, to name a few. The GUI shown may include one or more input fields through which a user can input information such as a desired amount or value of digital assets to be purchased. As shown, a user may designate a value of a digital asset to be purchased based upon a price determined by past and/or current purchases of digital assets across a digital asset exchange. The exemplary GUI shows a prospective limit purchase order with an order price lower than the market price. Accordingly, the prospective order will not be satisfied by the existing sell orders. The sell order book graphical representation thus remains unchanged. The light region in the lower left quadrant shows the prospective purchase order.

Figure 82F:

Turning to FIG. 82F, a screenshot of a GUI for use with a digital asset exchange according to exemplary embodiments described herein is illustrated. The GUI shown may present various information associated with purchasing digital assets on a digital asset exchange, for example, balance information (including digital currency and real-world currency), account value information (including present, past, and/or predicted values), historical trends (such as asset pricing), open orders, past orders, and/or user history, to name a few. The GUI shown may include one or more input fields through which a user can input information such as a desired amount or value of digital assets to be purchased. As shown, a user may designate a value of a digital asset to be purchased based upon a price determined by past and/or current sales of digital assets across a digital asset exchange. The exemplary GUI shows a prospective digital asset limit purchase order with a limit order price higher than the market price. Therefore, at least a portion of the order will be satisfied by the pending sell orders. Thus, the prospective purchase order graphical representation overlaps a portion of the pending sell order book graphical representation. In the upper right quadrant, the dark region shows the projected post-order graphical representation, which reflects that certain sell orders were fulfilled by the prospective purchase order, shifting the remaining sell order book to the right and decreasing the available sell order volume.

Figure 82G:
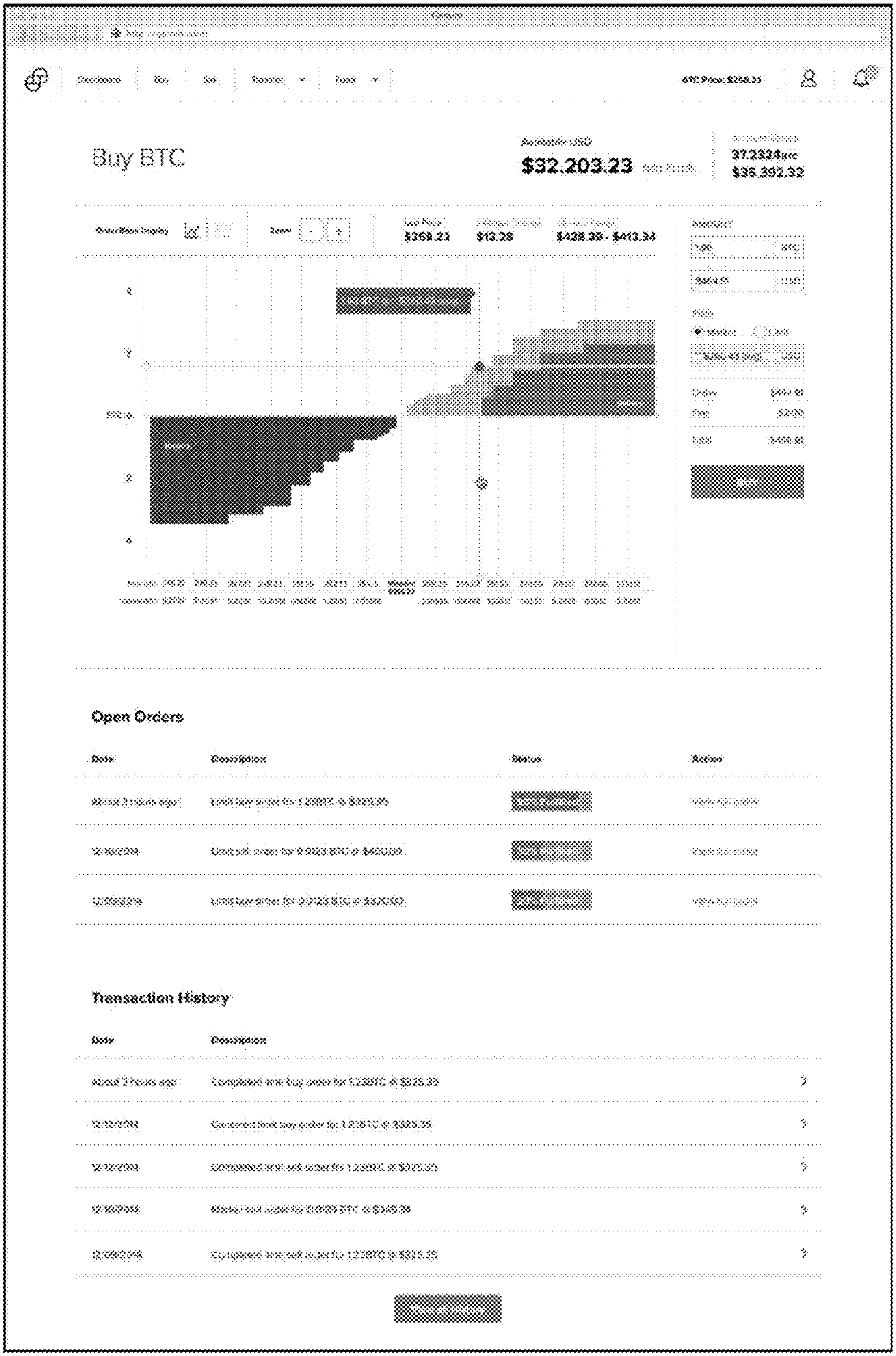

Turning to FIG. 82G, a screenshot of a GUI for use with a digital asset exchange according to exemplary embodiments described herein is illustrated. The GUI shown may present various information associated with purchasing digital assets on a digital asset exchange, for example, balance information (including digital currency and real-world currency), account value information (including present, past, and/or predicted values), historical trends (such as asset pricing), open orders, past orders, and/or user history, to name a few. The GUI shown may include one or more input fields through which a user can input information such as a desired amount or value of digital assets to be purchased. As shown, a user may designate a value of a digital asset to be purchased based upon an averaged market value of digital assets traded across a digital asset exchange. The exemplary GUI shows a prospective market purchase order. In the upper right quadrant, the dark region shows a post-order sell order book, which provides a visualization of how the sell order book will be modified by the prospective order. In this case, fulfilling the purchase order volume will reduce the available volume in the sell order book.

Figure 82H:
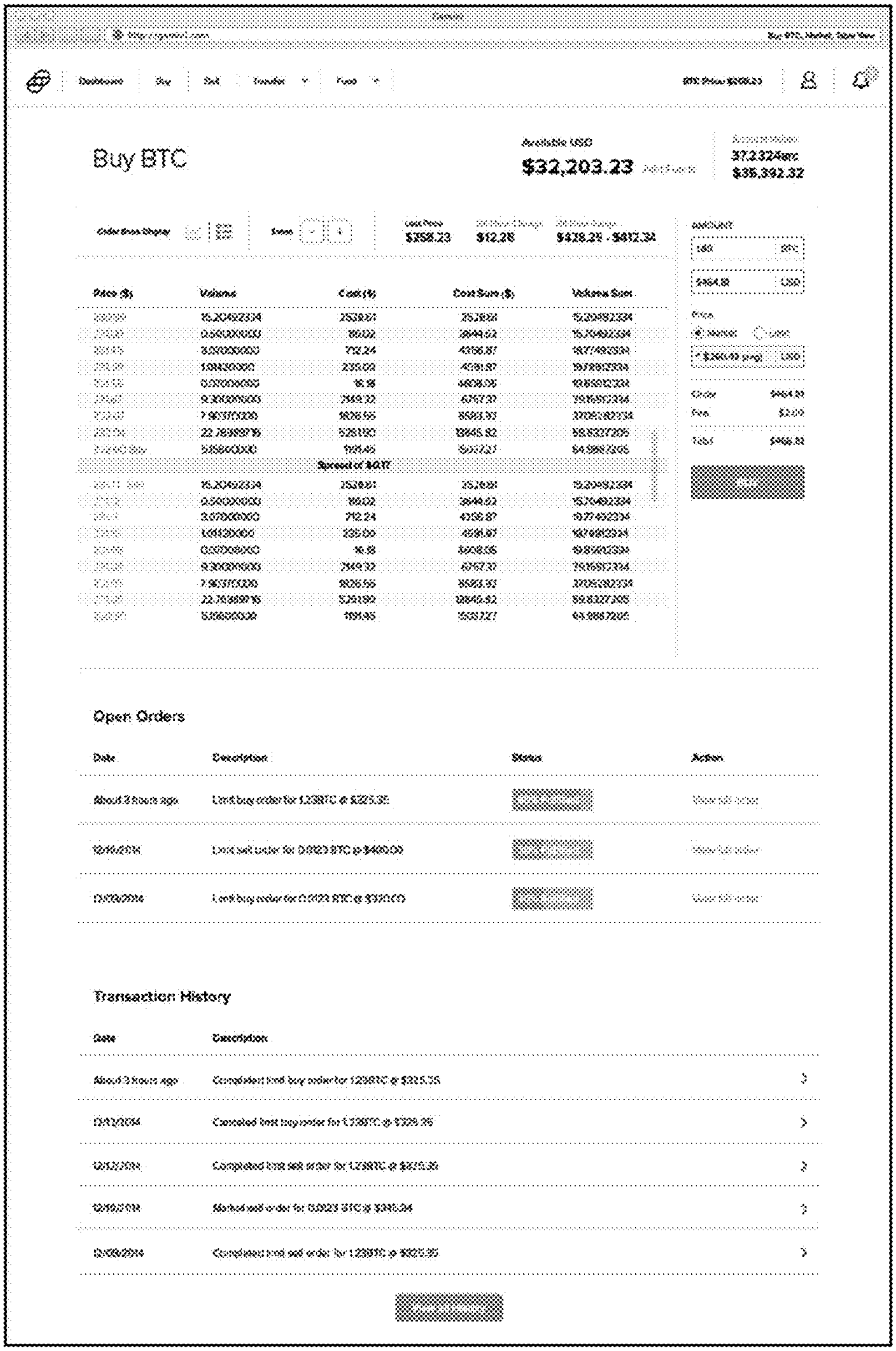
Figure 82I:
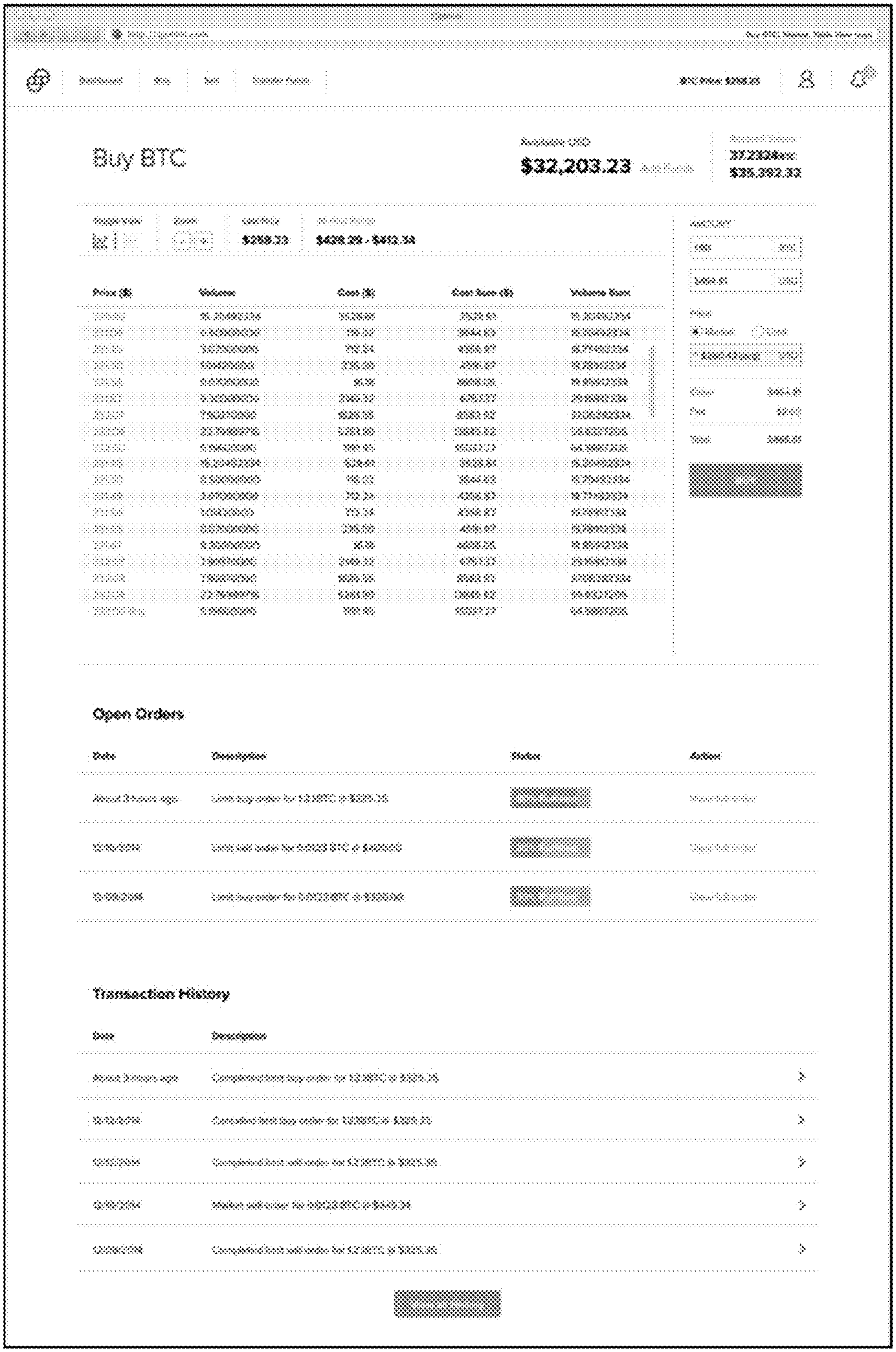
Figure 82J:
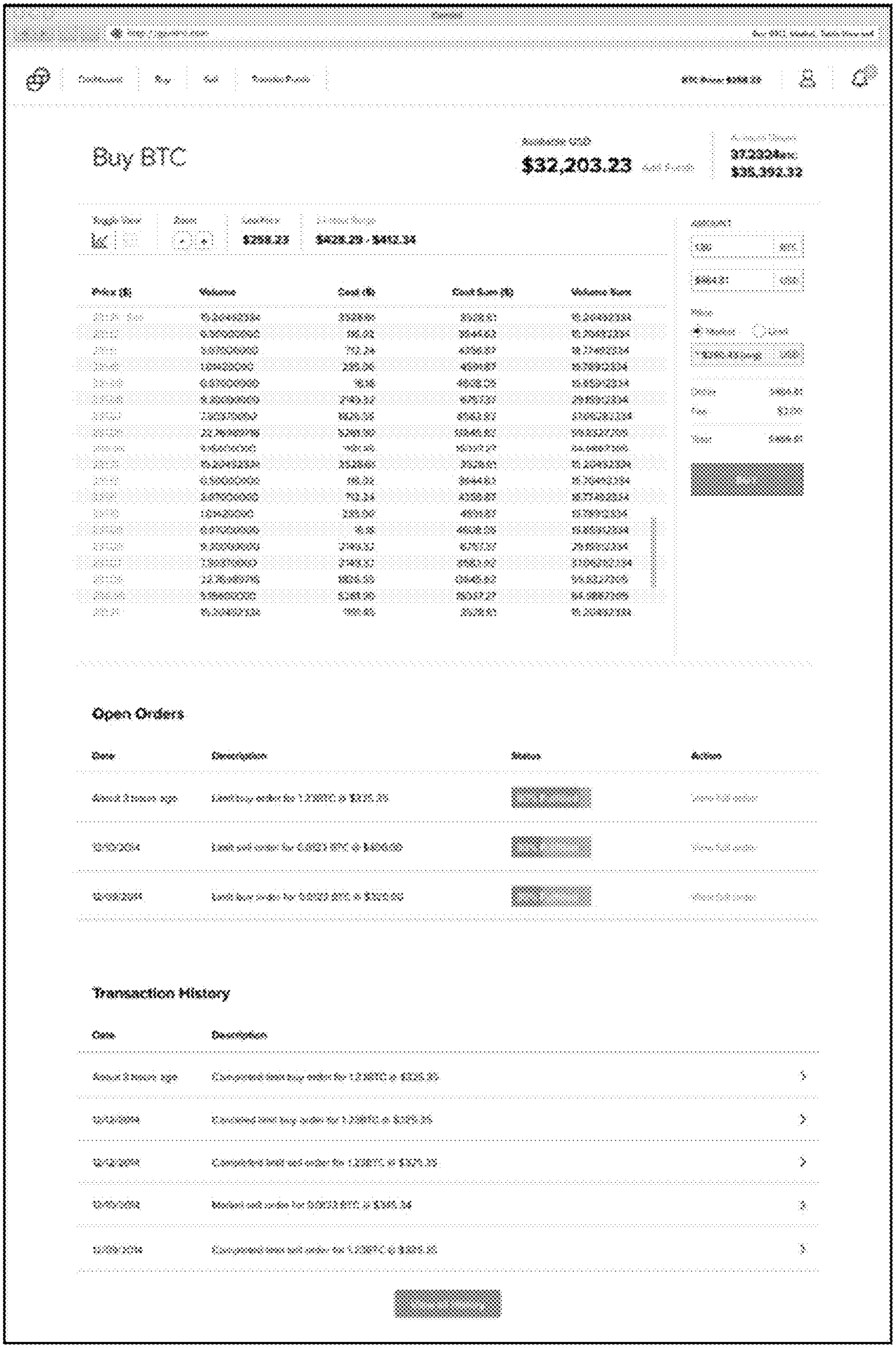

FIGS. 82H-J are screen shots of exemplary graphical user interfaces showing digital asset order listings for pending digital asset orders in an electronic order book in accordance with exemplary embodiments of the present invention. Like the dashboard and order graph GUIs described herein, an order listing GUI may display market activity data, exchange activity data, and/or user account data (e.g., account balances and/or values). An order listing GUI may provide user input fields where a user can specify order parameters, such as order types, order price (e.g., denominated in fiat currency), order amount (e.g., a quantity of digital assets), and/or order value (e.g., a total fiat amount corresponding to a price, such as a user specified price, and a quantity). An order listing GUI may include an open orders listing and/or a transaction history listing.

FIG. 82H shows a listing of pending digital asset orders from an electronic order book of the digital asset exchange, where the listing is centered at a spread value. The pending digital asset orders can include both digital asset purchase orders and digital asset sell orders. A pending order may be an order or portion of an order that is not yet fulfilled. The order listing may include for each order any of an order price (e.g., a price per unit of digital asset), order volume (e.g., a quantity of digital assets), order cost (e.g., the product of the order price and order volume), cost sum (e.g., a cumulative cost that sums the cost of the preceding orders of the same order type approaching the spread value), and a volume sum (e.g., a cumulative volume that sums the order volumes of the preceding orders of the same order type approaching the spread value).

A spread value may be displayed between the listing of pending purchase orders and the listing of pending sell orders. A graphical and/or textual indicator may indicate a current spread value, which may be determined based on the difference between the highest order price for a pending purchase order and the lowest order price for a pending sell order.

The order listings may be arranged according to price. Thus, the sell order listing may be arranged from highest price to lowest price, with the lowest price listed just before the spread value. After the spread value the purchase order listing may start with the highest purchase price and continue to list orders at each subsequent lower order price. In embodiments, the purchase orders may be listed above the spread value, and the sell orders may be listed below. In other embodiments, the sell orders may be listed first, above the spread value, and the purchase orders may be listed below the spread value. In embodiments, a subset of orders may be displayed in the graphical order listing at a given time. For example, a scroll bar may be used to navigate to additional orders towards the top and/or bottom of the list.

FIG. 82I shows an electronic order book listing where the list has been navigated (e.g., scrolled) up to display additional orders (e.g., buy orders).

FIG. 82J shows an electronic order book listing where the list has been navigated (e.g., scrolled) down to display additional orders (e.g., sell orders).

Figure 82K:
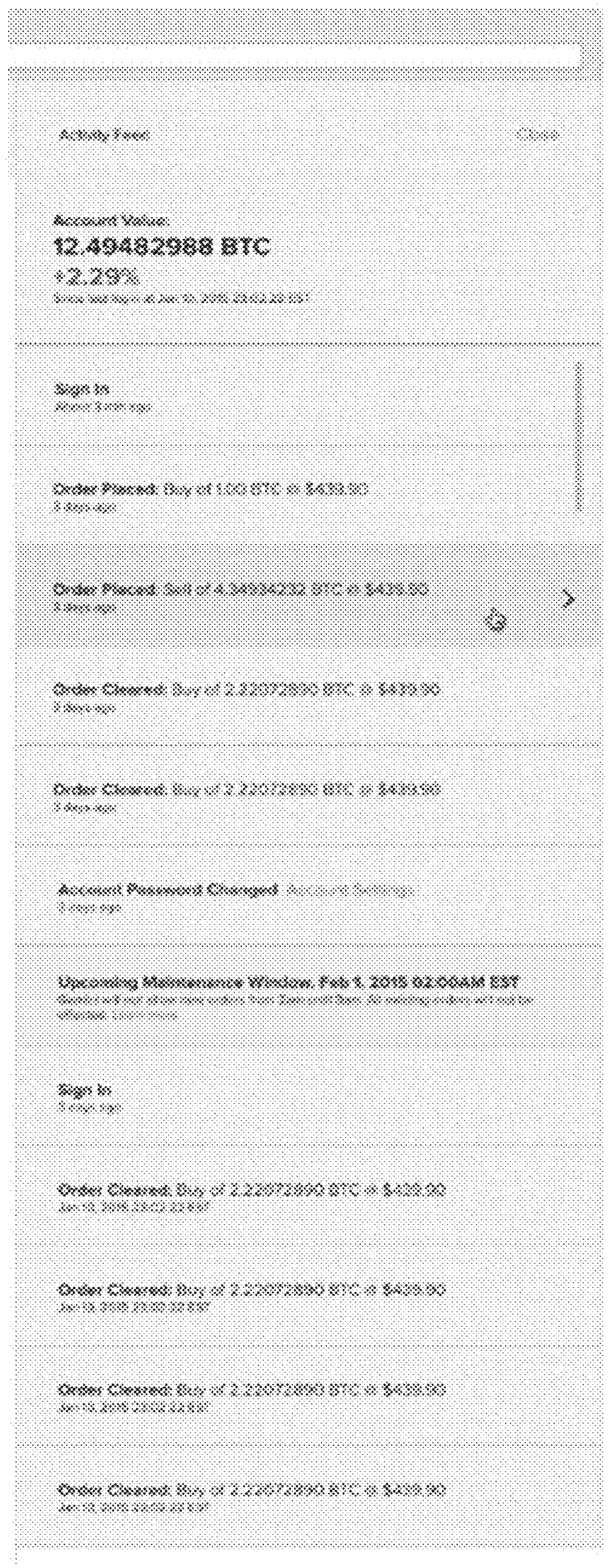
Figure 82L:
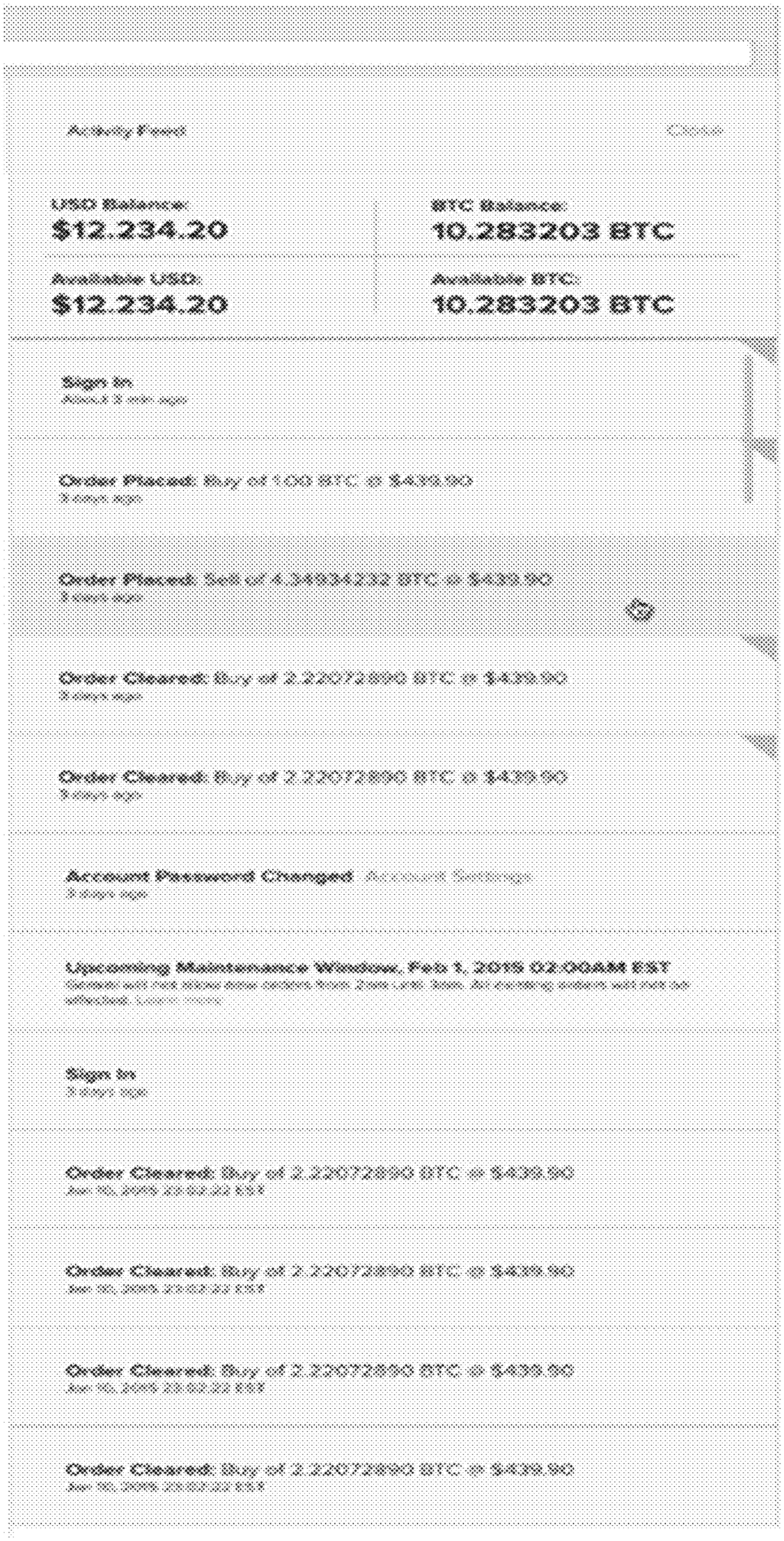

FIGS. 82K-L are screen shots of exemplary graphical user interfaces showing an activity feed related to a user account registered with a digital asset exchange. As illustrated, an activity feed may include account summary information, such as account balances, account values, and/or changes in account value (e.g., over a time period or since a particular time, such as a time of last logon to the exchange computer system). The activity feed may list events, which may be related to user actions (e.g., logging on, placing an order, canceling an order) and/or independent events (e.g., the clearing of an order). Each event may have a description (e.g., order parameters, status information) and/or an associated date and/or time indicator. The activity feed may also display digital asset news events and/or messages (e.g., schedule information for exchange computer system maintenance). Selecting (e.g., clicking, tapping, hovering) an activity feed entry may cause the GUI to display additional information related to the entry. The activity feed may be navigated (e.g., scrolling, selecting a button for additional entries) to display additional entries, which may be older activity feed entries.

FIG. 82L illustrates that unread activity feed entries may comprise an unread indicator, which may comprise a different color (e.g., background color) and/or a graphical representation (e.g., shape, triangle shape, icon, or text in the upper right corner or elsewhere within the entry). The unread indicator may be removed after a user hovers over the respective activity feed entry, selects it (e.g., clicks or taps it), and/or upon a subsequent opening of the activity feed.

FIGS. 96A-E are exemplary screen shots of user interfaces related to purchase transactions provided by an exchange computer system in accordance with exemplary embodiments of the present invention. Each graphical user interface may include navigation options for accessing other user interfaces (e.g., webpages or application GUIs). Such navigation options can include a dashboard selector 7302 (e.g., to access a dashboard GUI), a buy selector 7304 (e.g., to access a buy order GUI), a sell selector 7306 (e.g., to access a sell order GUI), and/or a transfer fund selector 7308 (e.g., to transfer funds to or from the exchange). Additional navigation options may be provided for accessing other GUIs, accessing data, and/or modifying the GUIs (e.g., displaying a menu, such as a drop-down menu, displaying an overlay or graphical panel). These additional navigation options can include a user account selector 7309 and/or an alerts or activity feed selector 7311, which may toggle display of an activity feed 7310. As illustrated, the activity feed 7310 can include user account information 7312, such as a fiat account balance, digital asset account balance, available fiat amount (e.g., not subject to pending orders), and/or available digital asset amount (e.g., not subject to pending orders). In embodiments where a digital asset exchange handles multiple fiat currencies and/or multiple digital assets, the interface may reflect such summary information for each currency and asset. In embodiments, the GUIs may also include order history listings, which may show completed orders and/or open orders.

The purchase order GUIs may include market summary information and/or exchange summary information 7318 (e.g., last price, 24-hour change, 24-hour range, and/or such values over other time periods). A time indicator may indicate a time at which the summary information was last updated.

Each purchase order GUI may also include purchase order parameter input fields, such as a digital asset quantity input field 7322, which may include a digital asset identifier (e.g., BTC). Such a digital asset identifier may be changeable by a user to select a particular digital asset type for the transaction. Purchase order parameter input fields can also include an order type selector 7324 (e.g., for choosing between market and limit orders), an order price input field 7326, and/or a total cost field 7328. In embodiments, the order price input field 7326 and/or the total cost field 7328 may comprise fiat currency identifiers, which may be changeable to specify or view a price in different fiat currencies. In embodiments, exchange transactions from one digital asset to a second digital asset may be performed, in which case the fiat currency identifiers would be replaced with digital asset identifiers.

In embodiments, the user may input one or more purchase order parameters and the exchange computer system may calculate one or more other purchase order parameters. In embodiments, only a user may change the order price. Accordingly, a user input in the total cost field 7328 may cause the exchange computer system to calculate a digital asset quantity order based at least in part upon the price parameter and/or to populate the calculated digital asset quantity in the digital asset quantity input field 7322. Similarly, a user input in the digital asset quantity input field 7322 may cause the exchange computer system to calculate, based at least in part upon the price parameter, a total cost and/or populate that total cost in the total cost field 7328. In other embodiments, the exchange computer system may be able to calculate and/or re-calculate the order price, in addition to the other order parameters. If two parameters are entered by a user the exchange computer system may calculate the last parameter and/or populate its respective field. If the user then changes one of the three parameters after those fields are each populated the exchange computer system may recalculate one of the parameters (e.g., the second to last parameter input, the third to last parameter input).

Selection of a purchase option 7336 (e.g., a purchase graphical button) may cause the exchange computer system to place a purchase and/or execute an order corresponding to the input order parameters.

Order information based at least in part upon the order parameters may be calculated and displayed in the GUIs. For example, an order sub-total 7330 may be the value from the total cost field 7328. A fees value 7332 may indicate any fees associated with the transaction (e.g., fees charged by the exchange, government fees, to name a few). An order total 7334 may indicate the sum of the order sub-total 7330 and the fees 7332.

Tables, charts, and/or graphs may provide graphical representations of exchange data, such as electronic order book data, prospective order data, and/or pending order data. An order book display type indicator 7320 may be used to toggle between different graphical representation types, such as toggling between an order book graph and an order book listing.

Figure 96A:
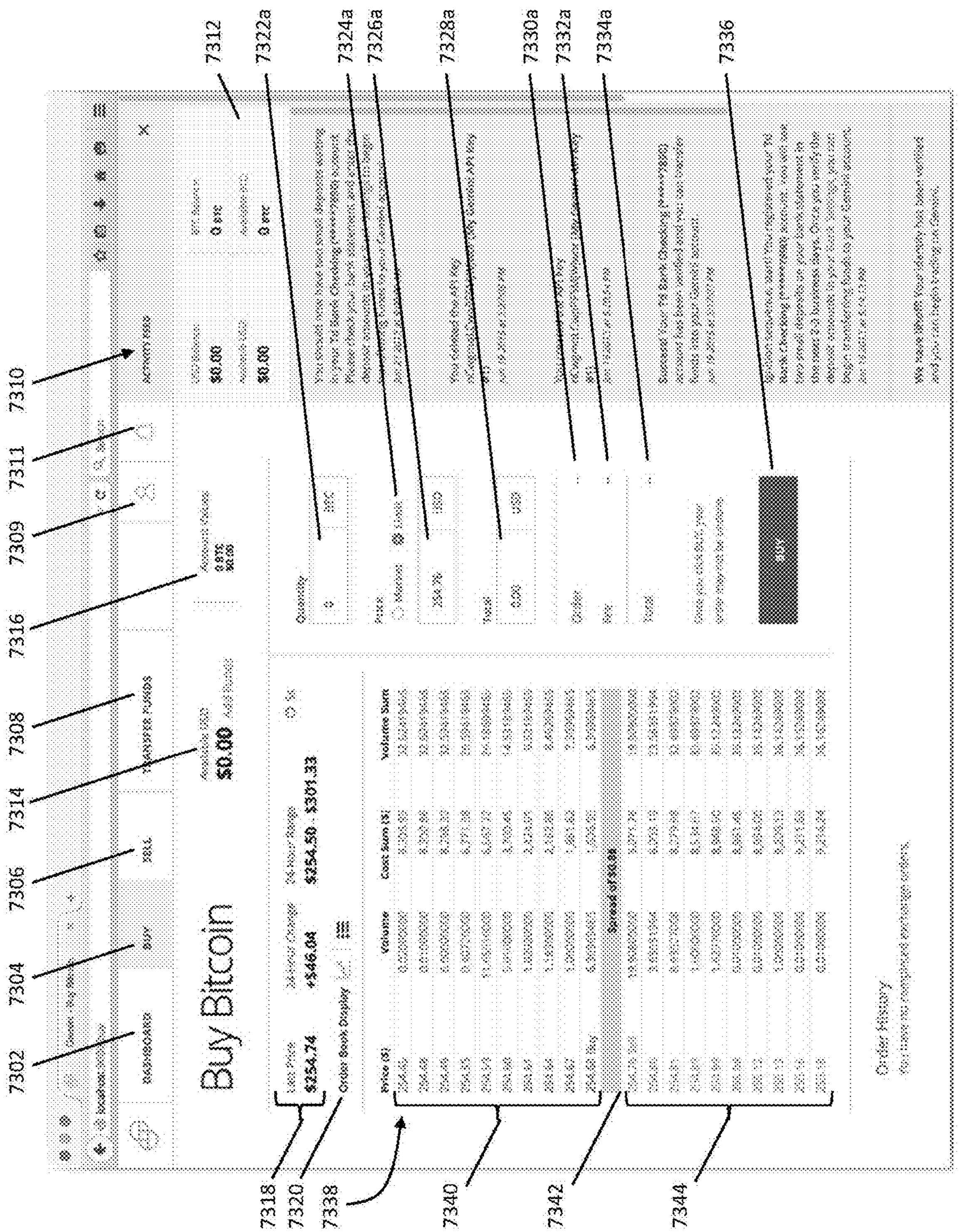

FIG. 96A shows a purchase order graphical user interface comprising an order book listing 7338. The order book listing 7338 may be a table comprising respective entries for each of a plurality of pending digital asset orders. In embodiments, the listing may comprise an entry for each order in the order book. In embodiments, the order book listing can comprise a truncated listing of orders in the exchange order book. Additional entries may be accessed by scrolling through the listing and/or selecting an option to display more entries. An entry may include order parameters such as an order price and/or digital asset volume or quantity. The order book listing 7338 may be arranged according to price, e.g., increasing order price or decreasing order price. A purchase or buy order book listing 7340 may comprise entries for each pending digital asset purchase order, and a sell order book listing 7344 may comprise entries for each pending digital asset sell order. The purchase orders may be grouped together in the purchase order book listing 7340, while the sell orders may be grouped together in the sell order book listing 7344. A graphical representation of a spread value 7342 may be displayed between the purchase and sell order book listings. The spread value graphical representation 7342 may comprise text indicating the spread value, which may be the price difference between the lowest sell order price and the highest purchase order price.

An order book listing entry may also include a cost sum, which may be a sum of the costs (e.g., product of price and digital asset quantity) of all preceding orders in the listing moving away from the spread value. Accordingly, the cost sum will be calculated separately on the buy side and the sell side of the order book listing. Similarly, an entry can include a volume sum, which may comprise a sum of the volumes of the previous order entries in the listing moving away from the spread value. In embodiments, the order book listing 7338 may include an entry for the prospective purchase order, which may be positioned within the purchase order book listing 7340 according to its order price parameter. Such an entry for a prospective order may be rendered with a different color (e.g., font color, background color, border color, to name a few).

Figure 96B:
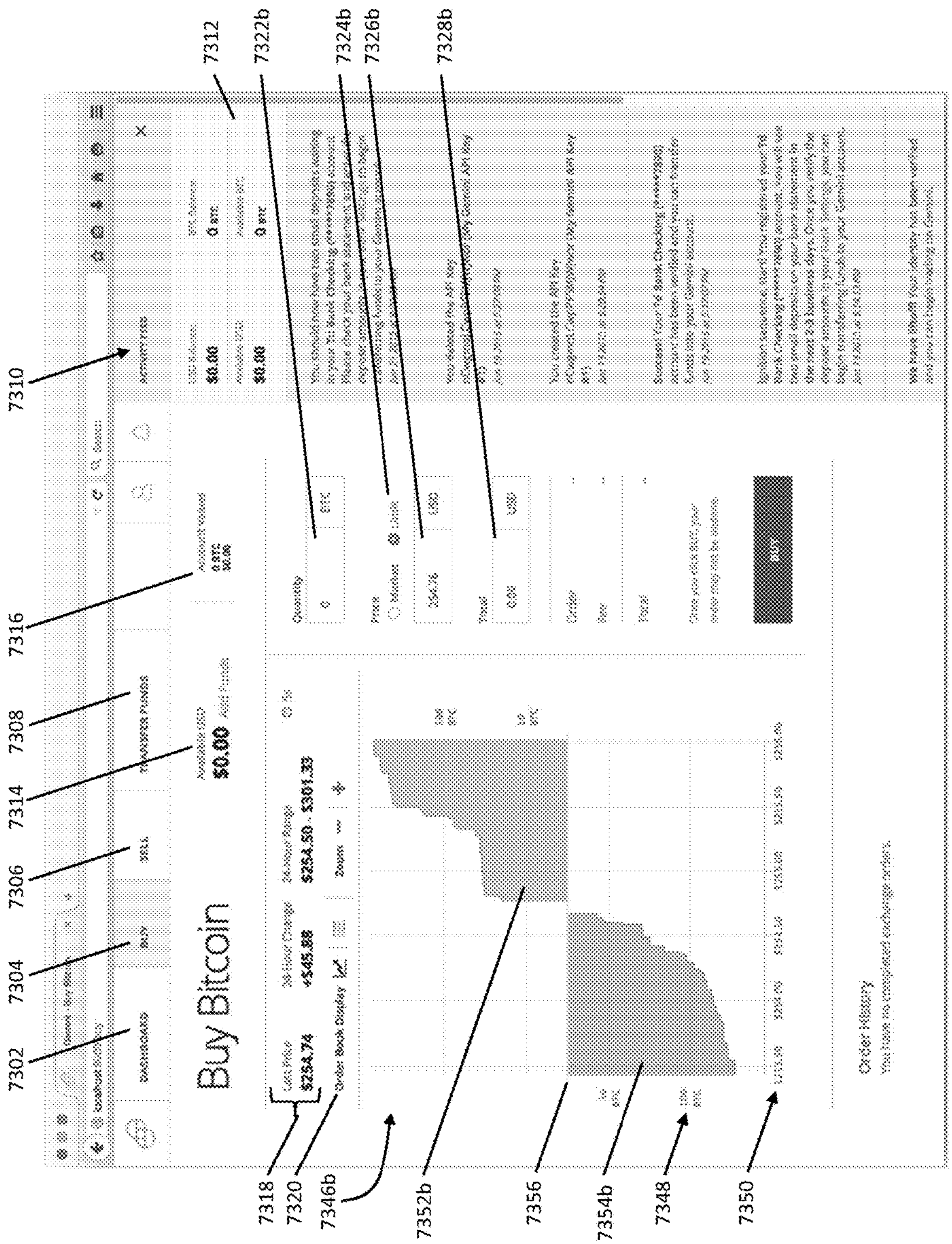

FIG. 96B shows a purchase order GUI comprising an electronic order book graphical representation 7346*b*. The order book graphical representation may have been selected using the order book display type indicator 7320. The order book graphical representation may be a graph having an order price axis 7356, which may be a first axis depicting order prices. It may be a horizontal axis. Price values 7350 may be displayed corresponding to the scaling of the order price axis 7356. The graph may also comprise a digital asset quantity axis 7348, which may extend outward from the order price axis 7356 in two directions, each direction indicating increasing digital asset quantity. In embodiments, the digital asset quantity axis 7348 may have a logarithmic scaling. A first order book graphical representation, which may be a sell order book graphical representation 7352*b*, may be depicted on a first side of (e.g., above) the order price axis 7356. The sell order book graphical representation 7352*b* may show at each order price a corresponding cumulative quantity of digital assets subject to pending digital asset sell orders. A second order book graphical representation, which may be a purchase order book graphical representation 7354*b*, may be depicted on a second side (e.g., below) the order price axis 7356. The purchase order book graphical representation 7354*b* may show at each order price a corresponding cumulative quantity of digital assets subject to pending digital asset purchase orders. A gap along the order price axis 7356 between the sell and purchase order book graphical representations may represent the spread value. In embodiments, a textual indicator of the spread value may be overlaid on the graph.

In embodiments, the order book graphical representations may only show a subset of pending digital asset purchase and/or sell orders. For example, a user may manipulate the scaling of the graph, such as by using zoom controls. A user may navigate the graph by scrolling or panning. In embodiments, the positions of the sell and buy order book graphical representations with respect to the order price axis 7356 may be flipped. The sell and buy order book graphical representations may be rendered using different colors and/or different shading or hatching techniques. For example, the sell order book graphical representation 7352*b* may be rendered as orange while the purchase order book graphical representation 7354*b* may be rendered as blue.

As can be seen, a digital asset quantity input field 7322*b* indicates a quantity of 0 digital assets. Accordingly, the graph may not show any representation corresponding to the prospective order defined by order parameters input by a user and/or calculated by the exchange computer system.

Figure 96C:
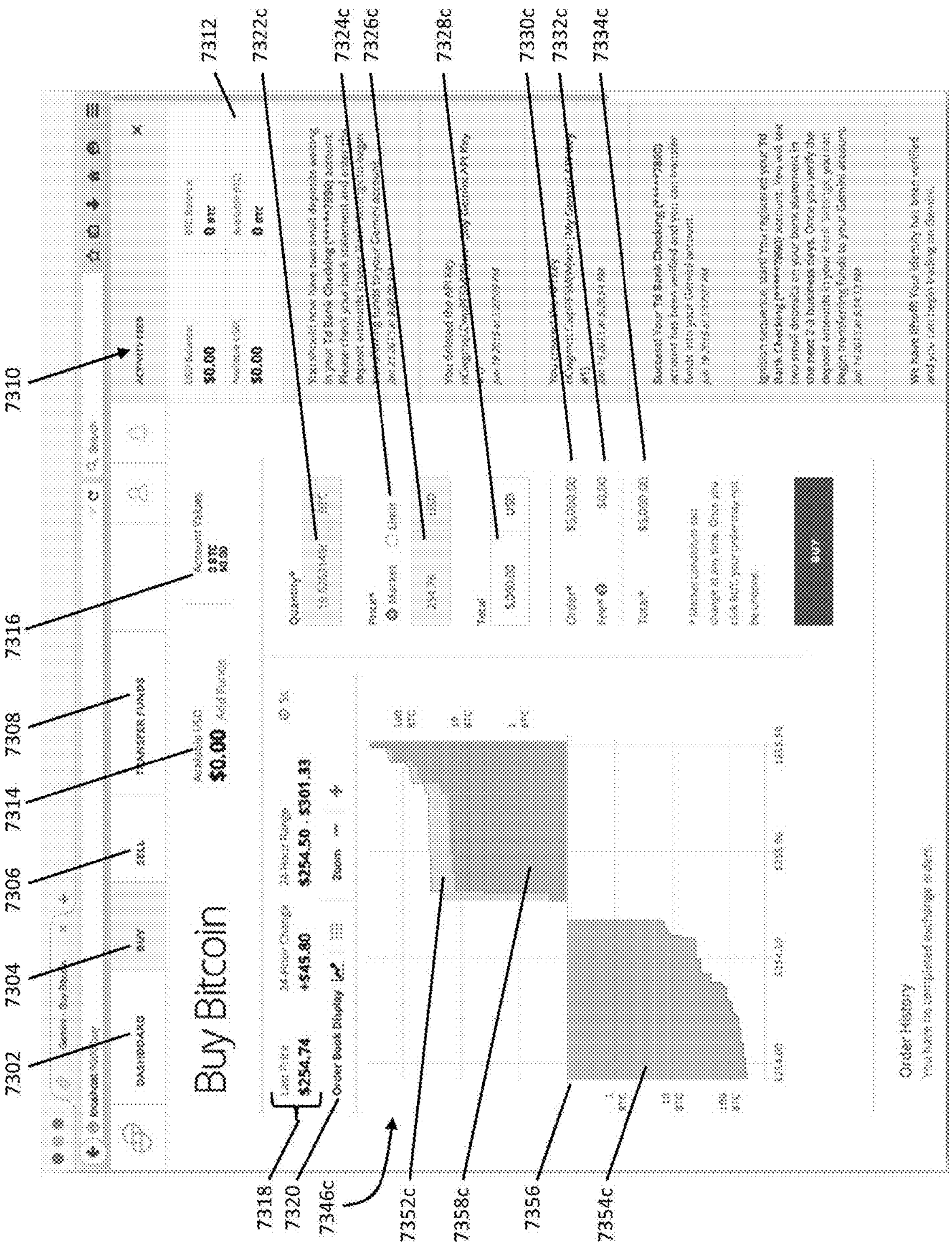

FIG. 96C shows a purchase order GUI comprising a graphical representation 7346*c* showing an electronic order book and prospective market purchase order. The order parameters define a prospective purchase order, which may be not yet submitted and therefore not yet pending on the electronic order book. The order type selector 7324*c* indicates that a market order was selected. Digital asset quantity input field 7322*c* contains a positive non-zero quantity, and accordingly a total cost field 7328*c* contains a positive non-zero quantity. The order price field 7326*c* contains an order price, which may be a current market price determined automatically by the exchange computer system upon a selection of a market order type. In embodiments, the order price for a market order may not be editable by a user. Accordingly, inputting and/or changing the value in the digital asset quantity input field 7322*c* may cause the computer system to calculate and/or re-calculate a corresponding total cost based at least in part upon the current market price. Similarly, inputting and/or changing the value in the total cost field 7328*c* may cause the computer system to calculate and/or re-calculate a corresponding digital asset order quantity based at least in part upon the current market price.

The order book and prospective order graphical representation 7346*c* comprises a sell order book graphical representation 7352*c* showing the pending digital asset sell orders and a purchase order book graphical representation 7354*c* showing the pending digital asset purchase orders. In embodiments, the purchase order book graphical representation 7354*c* may also depict the prospective purchase order data, which may be added to the pending purchase orders or overlaid as a separate graphical representation on the purchase order book graphical representation 7354*c*. In embodiments, the purchase order book graphical representation 7354*c* may show be a post-order purchase order book graphical representation showing the purchase orders that would exist after the prospective order is placed and/or executed. A post-order sell order book graphical representation 7358*c* may be overlaid on the graph to indicate how the prospective order would move the market. Such overlays may be rendered with a different color or a different shade of a color than the existing current order book graphical representations. For the exemplary market purchase order, the exchange computer system may place a series of orders starting with the lowest available price (e.g., whatever volume is available to purchase at the lowest sell order price) and increasing in price until the total cost is reached and/or until the digital asset order quantity is reached.

Figure 96D:
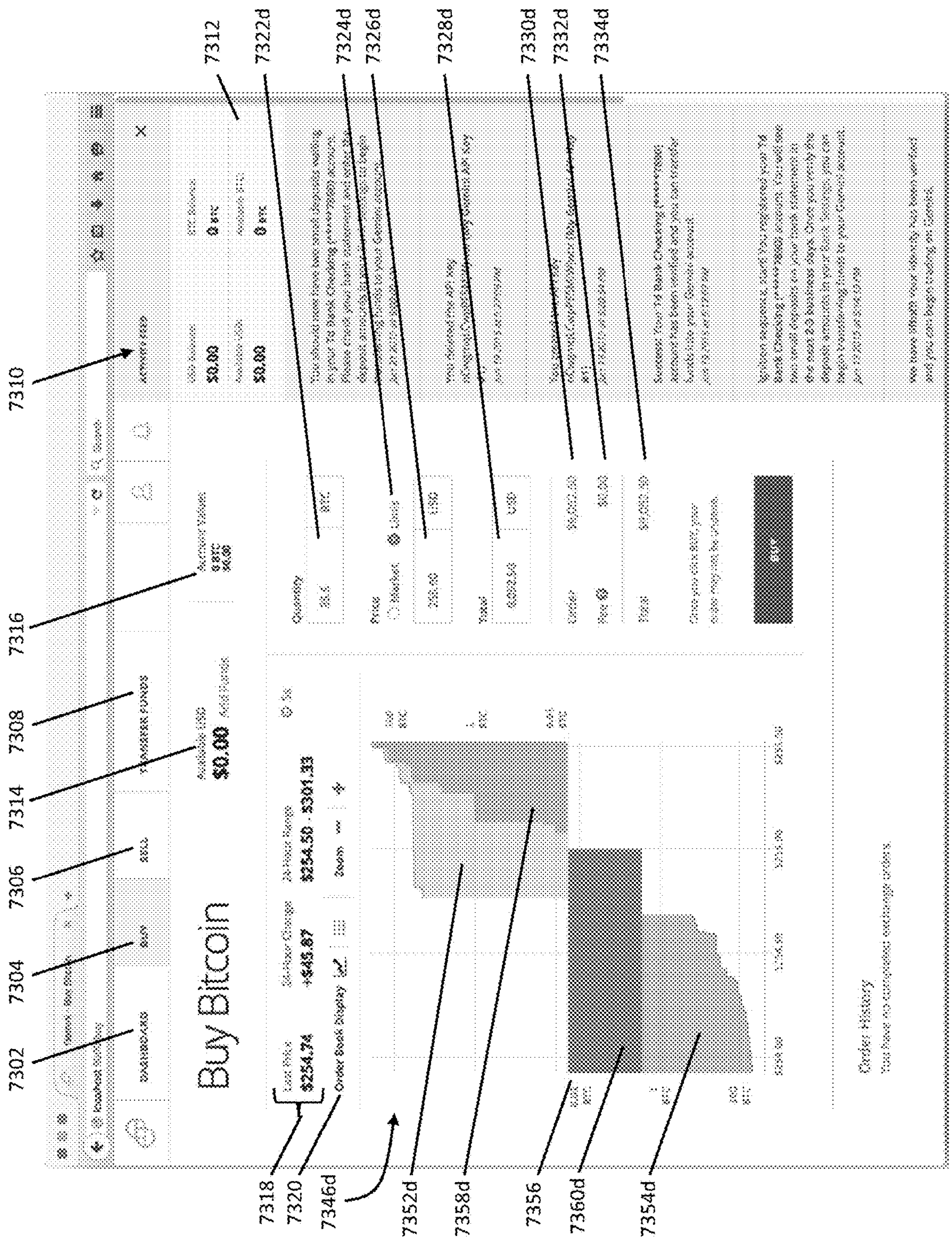

FIG. 96D shows a purchase order GUI comprising a graphical representation 7346*d* showing an electronic order book and prospective limit purchase order. The order type selector 7324*d* indicates a limit order, and the limit order price is specified in input field 7326*d*. The exemplary limit purchase order price is greater than the current market price. The order parameters define a limit order that can be characterized as in the money because at least a portion of the prospective order would be satisfied (e.g., fulfilled) by the currently pending sell orders.

The graph 7346*d* shows the current sell order book graphical representation 7352*d* and a post-order purchase order book graphical representation 7354*d*. This may show the purchase orders that would exist after the prospective limit purchase order is placed and/or executed. Accordingly, where only a portion of the prospective limit purchase order would be satisfied by the existing pending sell orders, the projected remainder of the prospective order may be added to the purchase order book graphical representation 7354*d*. That remainder of the limit purchase order (e.g., the portion that would not be satisfied by the current sell orders) may be represented on the graph by the limit purchase order graphical representation 7360*d*, which is overlaid on the purchase order book graphical representation 7354*d*. It shows the remaining (e.g., unfulfilled) prospective digital asset order quantity at the limit price and lower prices. In embodiments, the limit purchase order graphical representation 7360*d* may be rendered as a darker shade or different shade of the color used to render the current purchase order book graphical representation 7354*d*. Because the exemplary order is a limit order in the money, the remaining limit purchase order graphical representation 7360*d* makes clear that the prospective order exceeds the existing spread point (buying above the spread) and overlaps with some sell order prices, shown in the sell order book graphical representation 7352*d*. The overlapping portion would be fulfilled (e.g., fulfilled upon placement of the prospective order). The graph may include a post-order sell order book graphical representation 7358*d*, which may indicate the data that would compromise the sell order book after the prospective purchase order was placed and/or fulfilled. The remaining limit purchase order graphical representation 7360*d* does not overlap with the post-order sell order book graphical representation 7358*d*, illustrating that the remaining portion would not be fulfilled by the sell orders. Limit orders may be fulfilled by the exchange computer system matching engine in the order in which the orders were placed.

Figure 96E:
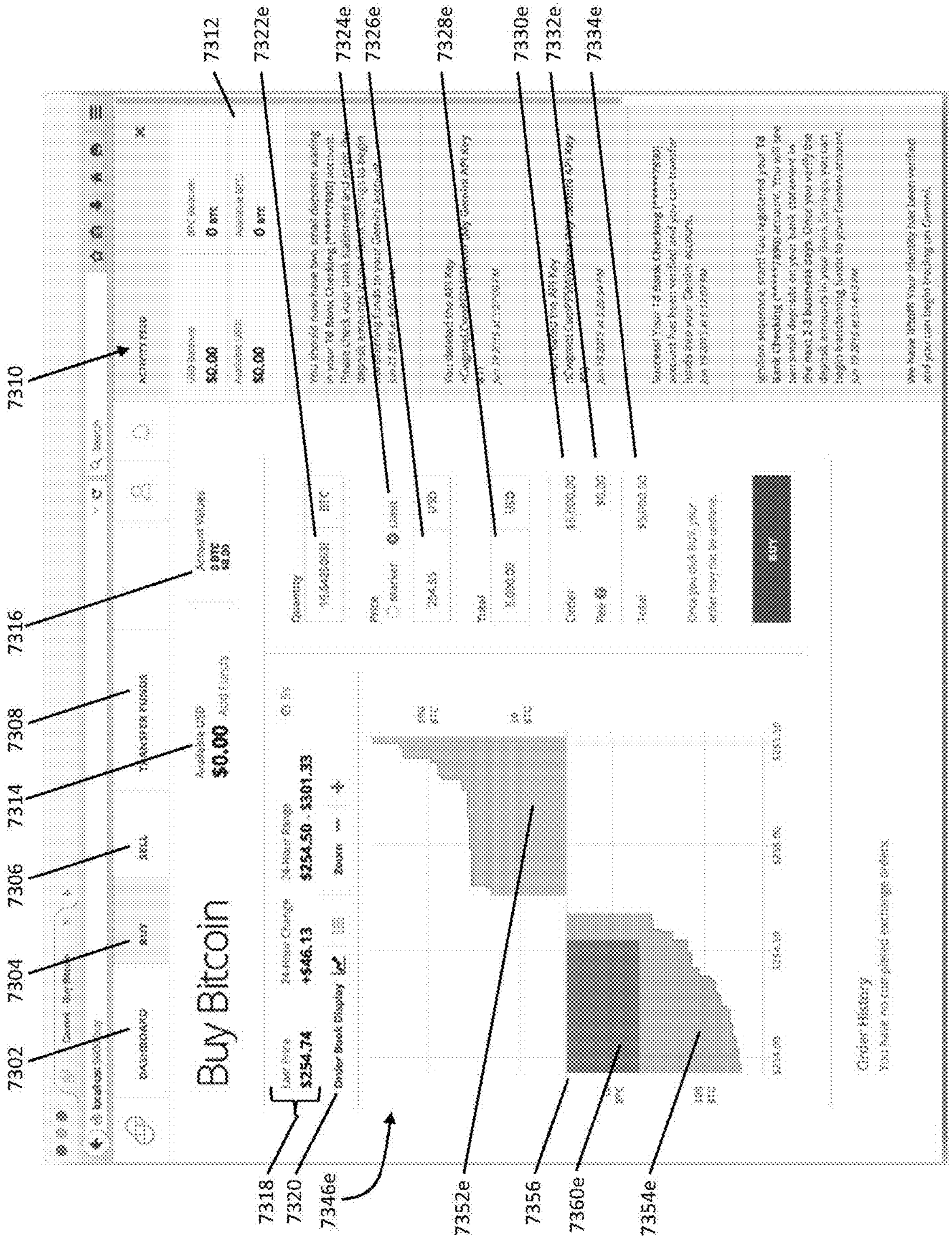

FIG. 96E shows a purchase order GUI comprising a graphical representation 7346*e* showing an electronic order book and prospective limit purchase order. The order type selector 7324*e* indicates a limit order, and the limit order price is specified in input field 7326*e*. The limit purchase order price is lower than the current market price. The order parameters define a limit order that can be characterized as out of the money because the order would not be satisfied by the currently pending sell orders.

The graph 7346*e* shows the current sell order book graphical representation 7352*e* and the purchase order book graphical representation 7354*e*. The limit purchase order is represented on the graph by the limit purchase order graphical representation 7360*e*, which is overlaid on the purchase order book graphical representation 7354*e*. In embodiments, the purchase order book graphical representation 7354*e* may be a post-order representation showing the purchase order book including the prospective purchase order. The limit purchase order graphical representation 7360*e* indicates the digital asset order quantity at the limit price and lower prices. As can be seen, there is no overlap in prices between the prospective purchase order and the sell order book. Accordingly, no portion of the prospective purchase order will be satisfied by the current sell order book. As illustrated, the sell order book will remain unchanged as a result of this purchase order. The purchase order would remain on the books until the user cancels it, until it automatically expires (e.g., in accordance with a predefined order expiry period), and/or until the market moves such that one or more sell orders are placed that satisfy the limit purchase order.

FIGS. 97A-E are exemplary screen shots of user interfaces related to sale transactions provided by an exchange computer system in accordance with exemplary embodiments of the present invention. The sell order GUIs may be rendered similar to the corresponding purchase order GUIs. In embodiments, the order parameter input fields may be located on a different side of the page (e.g., to the left of the order book graphical representation and/or listing instead of to the right).

Figure 97A:
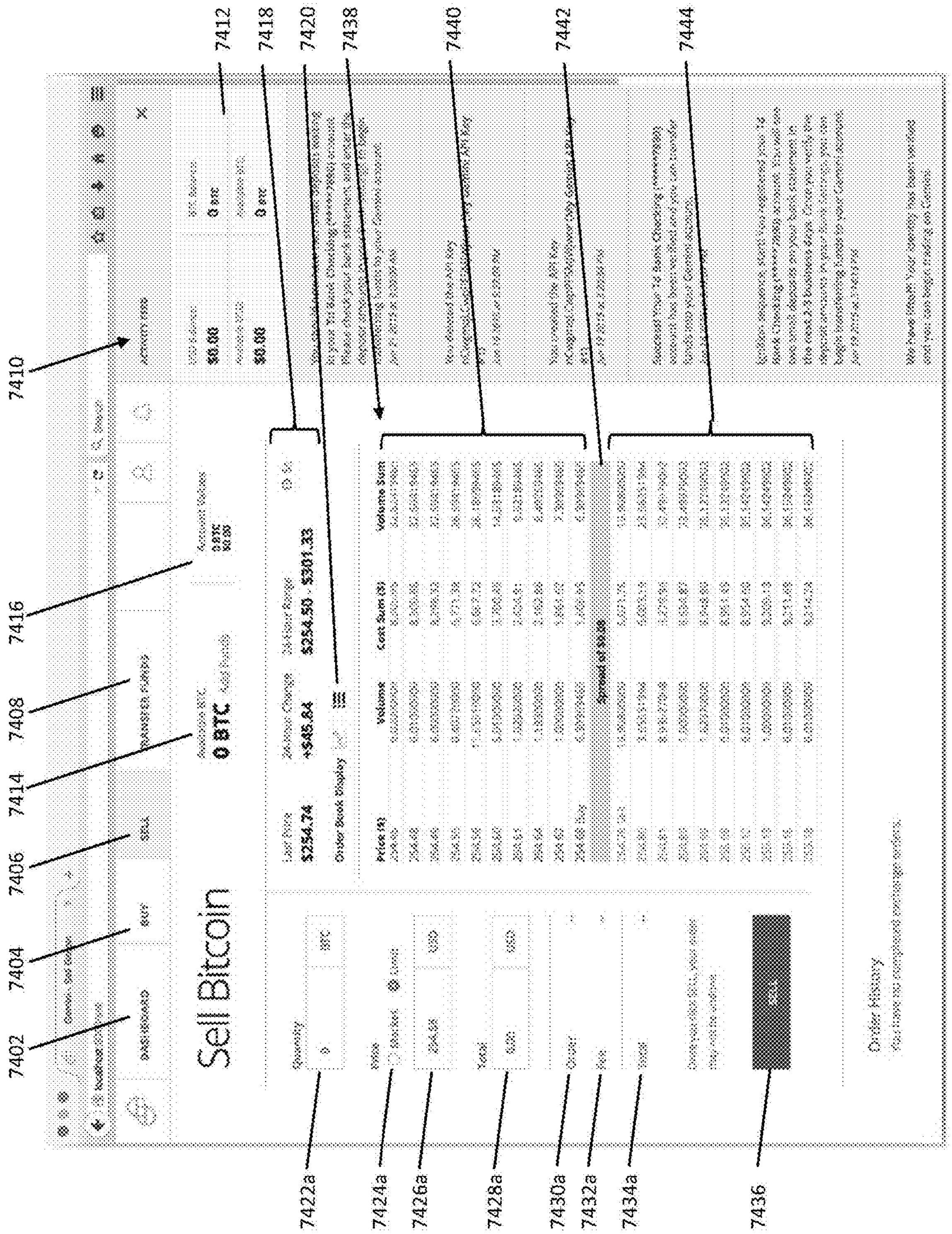

FIG. 97A shows a sell order graphical user interface comprising an order book listing 7438. This order book listing may be rendered similar to the order book listing 7348 for a purchase order GUI, described with respect to FIG. 96A.

Figure 97B:
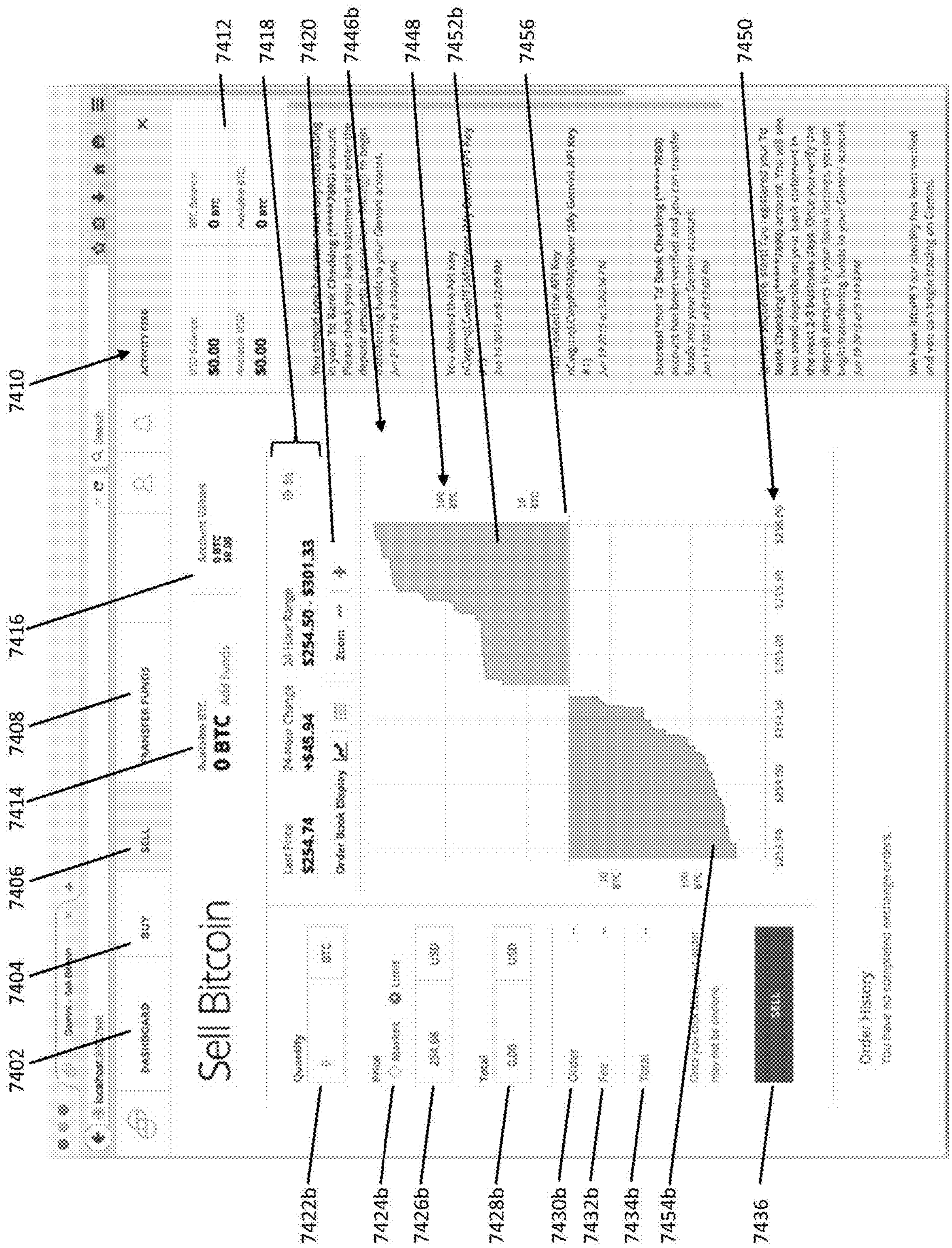

FIG. 97B shows a purchase order GUI comprising an electronic order book graphical representation 7446*b*. No prospective order is illustrated as part of the graphical representation 7446*b* because the digital asset order quantity is zero. As with FIG. 96B, the graph 7446*b* may include a sell order book graphical representation 7452*b* (e.g., above the price axis 7456) and a purchase order book graphical representation 7454*b* (e.g., below the price axis 7456).

Figure 97C:
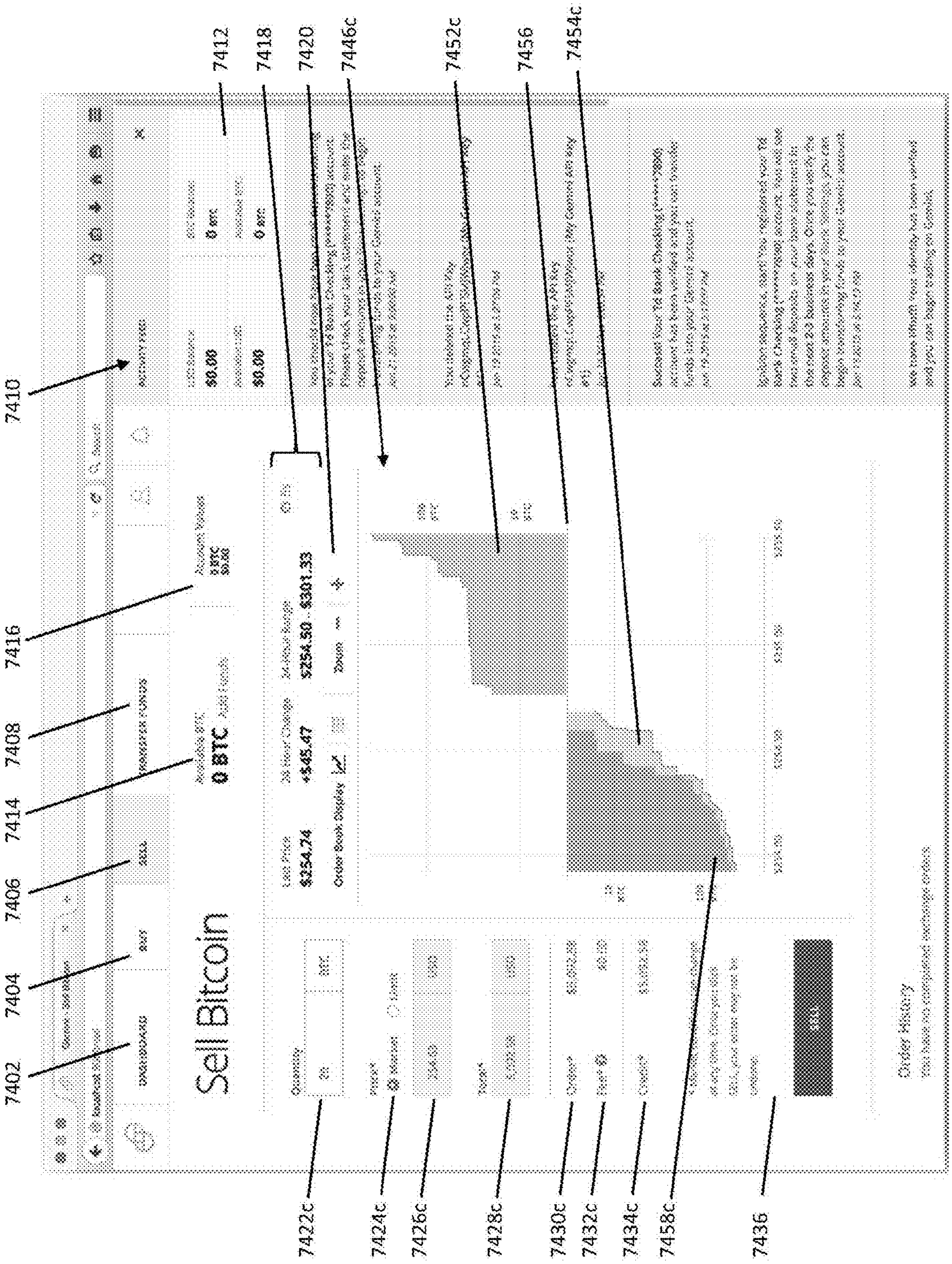

FIG. 97C shows a sell order GUI comprising a graphical representation 7446*c* showing an electronic order book and prospective market sell order. A market order is indicated by the order type selector 7424*c*. The graphical representation 7446*c* includes a sell order book graphical representation 7452*c* showing currently pending sell orders and a purchase order graphical representation 7454*c* showing currently pending purchase orders. A post-order purchase order book graphical representation 7458*c* indicates the cumulative order data that would comprise the purchase order book after placement and/or execution of the prospective sell order defined by the order parameters in the order parameter input fields. As with market purchase orders, a market sell order may cause the exchange computer system to place a plurality of sell orders until the order parameters are satisfied.

Figure 97D:
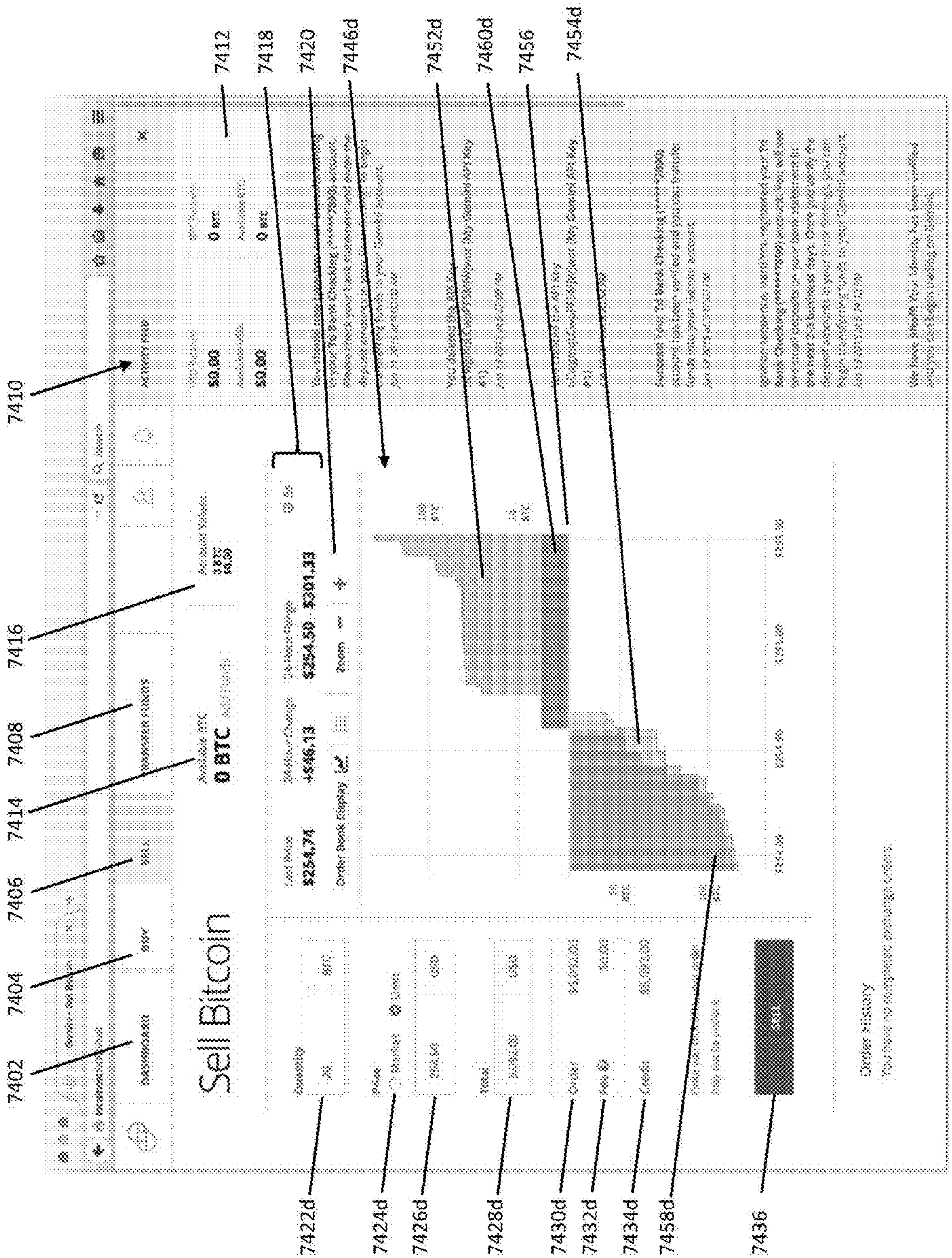

FIG. 97D shows a sell order GUI comprising a graphical representation 7446*d* showing an electronic order book and prospective limit sell order. The limit sell order price specified in field 7426*d* is less than the market price, and therefore the order will be in the money. At least a portion of the sell order will be satisfied by the currently pending purchase orders. The graph 7446*d* includes a sell order book graphical representation 7452*d* and a purchase order book graphical representation 7454*d*. The sell order book graphical representation 7452*d* may show the cumulative pending sell orders as well as the portion of the prospective sell order that would be unfulfilled by the current purchase orders and thus remain on the books. The unfulfilled portion of the prospective limit sell order may be indicated by a remaining prospective sell order graphical representation 7460*d*, which may be overlaid on the graph, e.g., on the sell order book side of the price axis 7456. The prospective sell order graphical representation 7460*d* may indicate the prospective digital asset order quantity at the sell order limit price and higher prices. Meanwhile, a post-order purchase order book graphical representation 7458*d* may be provided in the graph 7446*d*. It may be overlaid on the current purchase order book graphical representation 7454*d*. As can be seen, the prospective sell order overlaps at least some prices at which purchase orders exist shown in the current purchase order book graphical representation 7454*d*. Accordingly, at least a portion of the prospective sell order would be executed upon placement of the order.

Figure 97E:
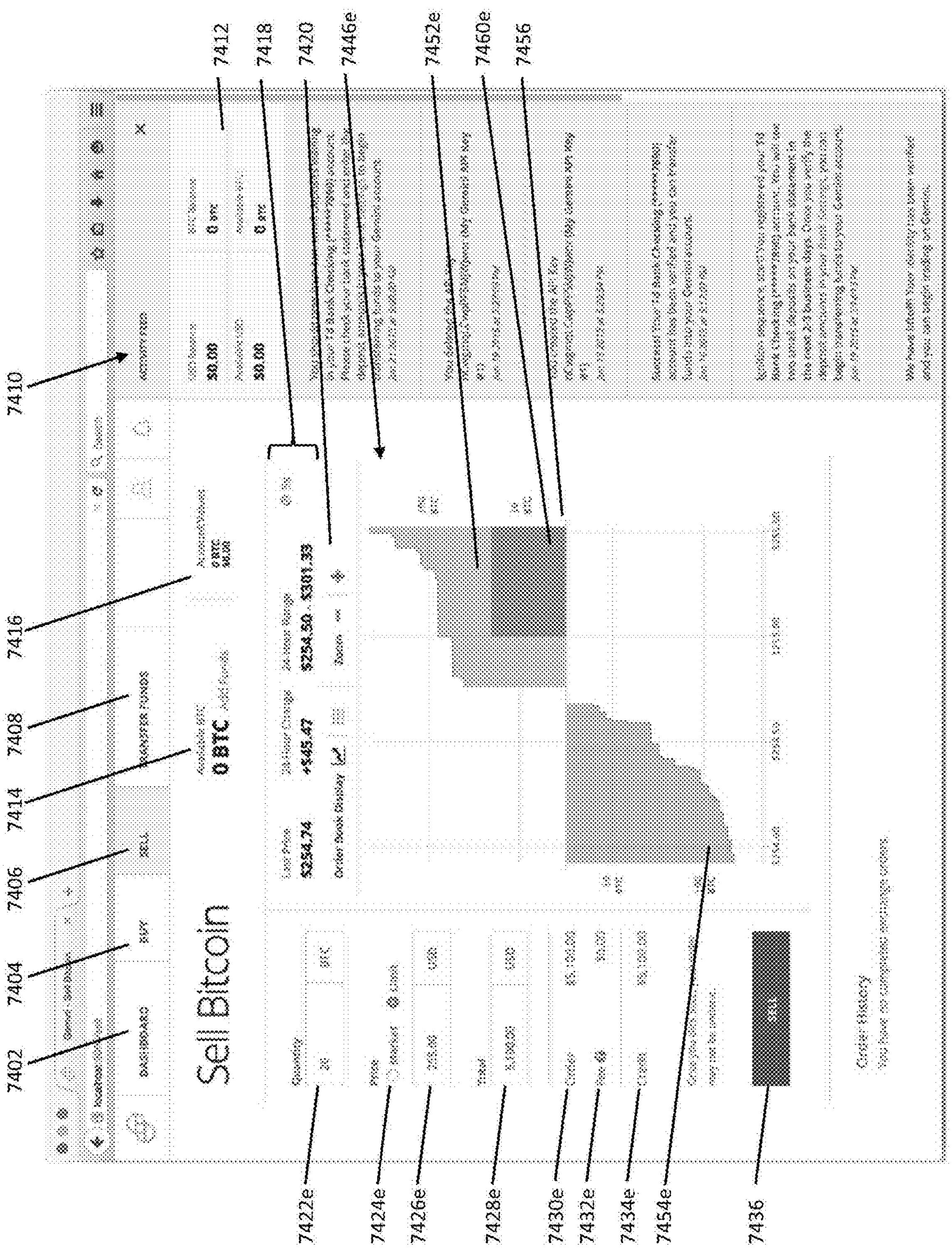

FIG. 97E shows a sell order GUI comprising a graphical representation 7446*e* showing an electronic order book and prospective limit sell order. The limit sell order price specified in field 7426*e* is greater than the market price, and therefore the order will be out of the money. The graph 7446*e* includes a sell order book graphical representation 7452*e* and a purchase order book graphical representation 7454*e*. A prospective sell order graphical representation 7460*e* may show the order parameters of the prospective limit sell order. The prospective digital asset order quantity may be shown at the sell limit price and higher prices. As illustrated there is no overlap with existing purchase orders. Accordingly, the prospective order would not be satisfied by the current purchase order book, and there is no post-order purchase book graphical representation because there would be no change to the purchase order book due to the prospective order.

It will be understood that information displayed across various exemplary embodiments of GUIs described herein may be displayed in the form of text and/or graphical representations. Such displayed information may be manipulated to a desired configuration by a user, for example, through scaling (such as minimization and maximization), highlighting, coloring, and/or rearrangement, to name a few.

FIGS. 98A-C are flow charts of exemplary processes for generating graphical user interfaces representing an electronic order book in accordance with exemplary embodiments of the present invention. These processes may enable a user of a user electronic device to view an electronic order book graphical representation. Such a representation may be updated automatically and/or dynamically, such as in response to changing data in the electronic order book (e.g., due to new orders, canceled orders, and/or filled or partially filled order), and/or in response to user input of new or changed order parameters). The electronic order book graphical representation can enable the user to view how a prospective order defined by its order parameters may move the market, the degree to which the prospective order will be filled and/or unfilled by currently pending orders, and/or a graphical comparison to the pending orders that comprise the electronic order book. An exchange computer system may interact with an application at a user electronic device (e.g., an installed and/or downloadable application, which may be a dedicated application or a general application, such as a web browser application, carrying out specific instructions provided by the exchange computer system). Interacting with the application can comprise sending and/or receiving data and/or transmitting machine-readable instructions to cause the application to render display content, such as particular graphical user interfaces or updates thereto. Transmitting such instructions to an application may activate it and/or cause it to carry out the instructions. Accordingly, the processes described in herein may dynamically generate graphical user interfaces and/or dynamically provide such graphical user interfaces (e.g., the instructions for rendering the graphical user interfaces) to one or more user electronic devices. In embodiments, the graphical user interface can be rendered by a viewer application on a remote device.

FIG. 98A shows an exemplary process for generating machine-readable instructions to render a graphical user interface comprising an electronic order book graphical representation. In a step S7502, an exchange computer system comprising one or more computers may receive from a user device, a request to access the electronic order book associated with a digital asset traded on an electronic exchange. Such a request may comprise a user selection of an order book display type indicator corresponding to a graphical representation display type.

In a step S7504, the exchange computer system may access, from non-transitory computer-readable memory, electronic order book information comprising digital asset order information for a plurality of digital asset orders. The digital asset order information may comprise respective order prices denominated in a flat currency and respective order quantities for each of the plurality of pending digital asset orders. The plurality of pending digital asset orders can include pending digital asset purchase orders and pending digital asset sell orders.

In a step S7506, the exchange computer system may calculate information for a first graphical user interface by determining at each respective order a price first cumulative quantity of digital assets subject to the pending digital asset purchase orders; and by determining at each respective order price a second cumulative quantity of digital assets subject to the pending digital asset sell orders.

In a step S7508, the exchange computer system may generate first machine-readable instructions to render the first graphical user interface including a first electronic order book graphical representation. The first electronic order book graphical representation may comprise a first axis depicting price denominated in the fiat currency; a second axis depicting digital asset quantity; a first set of graphical indicators on a first side of the first axis showing at each price visible along the first axis the first cumulative quantity of digital assets subject to the pending digital asset purchase orders; and a second set of graphical indicators on a second side of the first axis showing at each price visible along the first axis the second cumulative quantity of digital assets subject to the pending digital asset sell orders. In embodiments, the first axis may be a horizontal axis and the second axis may be a vertical axis. In embodiments, the axes may be flipped. In embodiments, the second axis may have a logarithmic scale.

In embodiments, the machine-readable instructions may comprise computer code such as Javascript, HTML, CSS to name a few. In embodiments, the machine-readable instructions may comprise data and/or layout instructions in a language associated with one or more user electronic device operating system types (e.g., iOS, Android, Windows, to name a few) and/or associated with applications (e.g., mobile applications) running on user electronic devices. In embodiments, the machine-readable instruction may comprise data such as JSON data.

In a step S7510, the exchange computer system may transmit to the first user electronic device the first machine-readable instructions so as to cause the first user electronic device (e.g., an application running on the first user electronic device, such as a dedicated downloadable application or a web browser application, which may be mobile applications) to render the first graphical user interface on a display associated with the first user electronic device. In embodiments, a web browser running one the first user electronic device may render the first graphical user interface, e.g., in a webpage. In embodiments, the exchange computer system may transmit the first machine-readable instructions to one or more other user electronic devices and/or other computer systems.

FIG. 98B shows an exemplary process for generating machine-readable instructions to render a graphical user interface for display by a viewer application comprising an electronic order book graphical representation and a prospective purchase order graphical representation. In embodiments, a viewer application may in addition to rendering a graphical user interface for display on a display device, such as an LED screen, may also accept user input of data or other information.

In a step S7512, the exchange computer system may receive from the first user electronic device, first digital asset order information corresponding to a first prospective digital asset purchase order. The first digital asset order information comprise a first order quantity of the digital asset and a first order price parameter related to a first order price of the digital asset. In embodiments, the first order price parameter may comprise a market order indicator. Accordingly, the first order price may be a market price. In embodiments, the exchange computer system may automatically determine the market price for the first order price, e.g., upon receipt of a market order indicator. In embodiments, the first order price parameter may comprise a limit order indicator. Accordingly, the first order price may be a limit price, which may be specified by the user.

In a step S7514, the exchange computer system may store in non-transitory computer-readable memory, the first digital asset order information as a prospective digital asset purchase order.

In a step S7516, the exchange computer system may calculate information for a second graphical user interface by determining at each respective order price a second order quantity of digital assets subject to the first prospective digital asset purchase order and by determining at each respective order price a third cumulative quantity of digital assets subject to the digital asset sell orders that would remain after fulfilling the first prospective digital asset purchase order. The exchange computer system may be specifically programmed to perform these non-routine calculations. They generate data values that enable the exchange computer system to generate machine-readable instructions for an unconventional GUI that provides enhanced order book visualization showing the potential impact of a prospective order. The potential impact of the order can include a visualization of how the order fits within the pending orders of the order book and/or how the order, once placed, will increase or decrease the pending cumulative sell order volumes and/or purchase order volumes available in the order book at each price. In embodiments, the second graphical user interface may be an updated version of the first graphical user interface.

In a step S7518, the exchange computer system may generate second machine-readable instructions to render the second graphical user interface including a second electronic order book graphical representation comprising a graphical representation of the first prospective digital asset purchase order superimposed on a modified first electronic order book graphical representation (e.g., modified to comprise a post-order electronic order book representation). The second electronic order book graphical representation may comprise the first axis depicting price denominated in the fiat currency; the second axis depicting digital asset quantity; the first set of graphical indicators on the first side of the first axis; the second set of graphical indicators on the second side of the first axis; a third set of graphical indicators on the first side of the first axis showing at each price visible along the first axis the respective second order quantity of digital assets subject to the first prospective digital asset purchase order; and a fourth set of graphical indicators on the second side of the first axis showing at each price visible along the first axis the respective third cumulative quantity of digital assets subject to the digital asset sell orders that would remain after fulfilling the first prospective digital asset purchase order.

In embodiments, the third set of graphical indicators may not be displayed, such as for a market order. In embodiments, the first prospective digital asset purchase order may be characterized as out of the money, and the third respective cumulative quantity of digital assets at each price may be zero.

In embodiments, at least one of the first axis or the second axis of the first electronic order book graphical representation have a different scale than the corresponding first axis and the corresponding second axis of the second electronic order book graphical representation. In embodiments, the scaling may be changed upon receipt of an electronic request from the user (e.g., via selection of an element, such as a rendered button, of the graphical user interface). In embodiments, the user may navigate and/or scroll along the axes of the graph and/or zoom in and/or out.

In embodiments, the exchange computer may further determine at each respective order price a fourth cumulative quantity of digital assets subject to both the digital asset purchase orders and the first prospective digital asset purchase order that would remain after fulfillment of at least a portion of the first prospective digital asset purchase order by the pending digital asset sell orders. The first set of graphical indicators of the second electronic order book graphical representation may show at each price visible along the first axis the fourth cumulative quantity of digital assets.

In a step S7520, the exchange computer system may transmit to the first user electronic device, the second machine-readable instructions so as to cause the first user electronic device (e.g., an application running on the first user electronic device, e.g., on one or more processors) to render the second graphical user interface on the display. The first user electronic device (e.g., the application running thereon) may render the second electronic order book graphical representation according to the second machine-readable instructions.

FIG. 98C shows an exemplary process for generating machine-readable instructions to render a graphical user interface comprising an electronic order book graphical representation and a prospective sell order graphical representation.

In a step S7522, the exchange computer system may receive from the first user electronic device, first digital asset order information corresponding to a first prospective digital asset sell order. The first digital asset order information may comprise a first order quantity of the digital asset and a first order price parameter related to a first order price of the digital asset, the first order price denominated in the fiat currency.

In a step S7524, the exchange computer system may store in non-transitory computer-readable memory, the first digital asset order information as a prospective digital asset sell order.

In a step S7526, the exchange computer system may calculate information for a second graphical user interface by determining at each respective order price a second order quantity of digital assets subject to the first prospective digital asset sell order and by determining at each respective order price a third cumulative quantity of digital assets subject to the digital asset purchase orders that would remain after fulfilling the first prospective digital asset sell order. These non-routine calculations enable generation of an unconventional GUI that can show electronic order book data with a visualization that enhances rapid understanding of the bounds of the pending buy and sell orders as well as how the prospective order may interact with the existing orders (e.g., to be fulfilled, partially fulfilled, unfulfilled, and/or to move the market by changing the pending orders that remain on the electronic order book).

In a step S7528, the exchange computer system may generate second machine-readable instructions to render the second graphical user interface including a second electronic order book graphical representation comprising a graphical representation of the first prospective digital asset purchase order superimposed on a modified first electronic order book graphical representation (e.g., modified to comprise a post-order electronic order book graphical representation). The second electronic order book graphical representation may comprise the first axis depicting price denominated in the flat currency; the second axis depicting digital asset quantity; the first set of graphical indicators on the first side of the first axis; the second set of graphical indicators on the second side of the first axis; a third set of graphical indicators on the first side of the first axis showing at each price visible along the first axis the respective third cumulative quantity of digital assets subject to the digital asset purchase orders that would remain after fulfilling the first prospective digital asset sell order; and a fourth set of graphical indicators on the second side of the first axis showing at each price visible along the first axis the respective second order quantity of digital assets subject to the first prospective digital asset sell order. These machine-readable instructions may provide an unconventional GUI that facilitates order book visualization, including visualization of the degree to which a prospective order may be satisfied and how it may move the market.

In embodiments, the exchange computer system may determine at each respective order price a fourth cumulative quantity of digital assets subject to both the digital asset purchase orders and the first prospective digital asset purchase order that would remain after fulfillment of at least a portion of the first prospective digital asset purchase order by the pending digital asset sell orders. The first set of graphical indicators of the second electronic order book graphical representation may show at each price visible along the first axis the fourth cumulative quantity of digital assets.

In a step S7530, the exchange computer system may transmit to the first user electronic device, the second machine-readable instructions so as to cause an application at the first user electronic device to render the second graphical user interface on the display. The first user electronic device may render the second electronic graphical user interface according to the second machine-readable instructions.

In embodiments, transmitting data and/or machine-readable instructions to a user electronic device and/or to an application on the user electronic device may activate the application and/or cause it to render display content on a display screen.

In embodiments, graphical user interfaces similar to those described herein may be generated to show order book and order information related to other types of exchange transactions, such as a first digital asset to a second digital asset, a first fiat currency to a second fiat currency, or a first commodity to a second commodity, to name a few.

Centralized Digital Asset Exchange

In embodiments, the exchange may hold customer fiat currency and/or digital assets in centralized, pooled accounts or wallets. The exchange may maintain an electronic ledger to record transactions among users of the exchange. Separate electronic fiat account ledgers and electronic digital asset ledgers may be maintained. Maintaining a ledger may involve electronically updating the ledger to reflect pending transactions and/or completed transactions, which may involve debiting assets from a user's account and/or crediting assets to a user's account. Broadcast to a digital asset network and confirmation from a digital asset network may not be performed for transactions within the exchange, e.g., transactions between a digital asset seller selling digital assets that are stored by the exchange and a buyer paying with flat currency that is held in an exchange bank account, such as a pooled account.

In embodiments, for both a decentralized and a centralized exchange the exchange may provide the ability for customers to purchase digital assets from the exchange and/or sell digital assets to the exchange such that the exchange operator or owner is the counterparty to the transaction. Transaction amount limits may be placed on such transactions and/or additional fees may be charged. In addition, in embodiments, the exchange may provide a dashboard interface for users (such as registered users) to purchase SVCoins using fiat currency and/or digital assets and/or to redeem digital assets in the form of SVCoins. In embodiments, the dashboard interface for the exchange may also allow users to redeem SVCoins for fiat currency. Since SVCoins are pegged to a fixed notional value of fiat currency or some other fixed asset, when SVCoins are purchased an equal amount of flat (or other fixed asset) will be set aside by the exchange as a reserve for when the SVCoins are redeemed. Similarly, when SVCoins are redeemed, payment for such redemption shall come from reserves set aside for such redemption.

Exchange Operations Systems

In embodiments, a digital asset exchange may require users to open designated accounts associated with the user in order to participate in the exchange. Each user may have a digital math-based asset account to record and maintain such user's digital math-based assets and a fiat account to record and maintain such user's fiat assets. In embodiments, the flat assets recorded in the fiat account may be U.S. Dollars ("USD") held in one or more omnibus bank accounts with one or more FDIC-insured depository institutions or banks. In embodiments, a digital math-based asset computer system of a digital asset exchange may record in an electronic ledger information associated with a user account, such as digital math-based asset purchase orders, digital math-based asset sell orders, digital math-based asset purchase offers, digital math-based asset sell offers. In embodiments, digital math-based asset purchase offers and digital math-based asset sell offers may be converted into digital math-based asset purchase orders and digital math-based asset sell orders, respectively, according to a user's instructions, if certain user-specified factors are met (e.g., digital math-based assets are within a given price, quantity, period of time, to name a few). In embodiments, when the digital math-based asset computer system matches an electronic digital math-based asset purchase order with an electronic digital math-based asset sell order, the digital math-based asset computer system may record the trade in an electronic ledger, effectively transferring ownership of the seller's traded digital math-based assets to the buyer, and ownership of the related purchase price in fiat currency from the buyer to the seller. In embodiments, the changes in a user's ownership of digital math-based assets and fiat currency recorded in the electronic ledger are reflected in a user's digital math-based asset account and fiat account.

In embodiments, a digital asset exchange may accept payment methods (e.g., credit card transactions; Automated Clearing House (ACH) debits, wire transfers, digital asset transactions, to name a few) for purchases of digital assets.

In embodiments, a digital asset exchange may hold digital math-based assets and/or fiat currency in trust for users. Fiat currency may be maintained in accounts with a state or federally chartered bank and may be eligible for FDIC insurance, subject to compliance with applicable federal regulation. In embodiments, a digital asset exchange may also operate a digital math-based asset storage system, in which users may deposit digital math-based assets. In embodiments, fiat currency may be transmitted to a digital asset exchange's omnibus account. In embodiments, the exchange may transmit fiat currency back to a user upon receiving a request from a user.

In embodiments, a digital asset exchange may comply with relevant laws and regulations whereby the exchange may operate in a highly regulated banking environment and permit necessary supervision by relevant legal authorities. In embodiments, a digital asset exchange may comply with rules and regulations promulgated by a self-regulatory organization. In embodiments, when a user commences an electronic digital math-based asset purchase order to acquire digital math-based assets, the user may either have fiat currency in an associated user account or the buyer may send fiat currency to the digital asset exchange's omnibus account at the applicable bank. In embodiments, when a seller commences an electronic digital math-based asset sell order to sell digital math-based assets, the seller may either have digital math-based assets in an associated user account or may send digital math-based assets to a digital math-based asset account. In embodiments, the seller may send digital math-based assets to one or more of digital wallets held by the exchange. In embodiments, exchange transactions may only be completed after the digital math-based asset computer system verifies that the digital math-based asset accounts and fiat accounts associated with the users involved in the transaction at least equal the quantities required by the transaction. In embodiments, the exchange may permit trading twenty-four hours a day, seven days a week. In embodiments, the exchange may shut down for scheduled and/or unscheduled maintenance periods. In embodiments, the exchange may prohibit users from transferring fiat currency outside of normal business hours, in order to comply with applicable laws and regulations. In embodiments, the exchange may allow users to deposit and withdraw digital math-based assets outside of normal business hours. In embodiments, the exchange may permit users to sell digital math-based assets for fiat currency or buy digital math-based assets with fiat currency if the user holds sufficient fiat currency in its associated account prior to initiating the transaction.

Exchange-Based Stable Value Coin to Fiat Portal

FIGS. 14A-14G, 14A-1, and 14D-1 illustrate a method of issuing stable value digital asset tokens. In embodiments, this method may control the risk associated with loss of control of an on-line key pair by using variable permission custodians. In embodiments a requester (e.g., user, customer, etc.) may want to obtain (e.g., purchase, withdraw, to name a few) stable value digital asset in exchange for currency (e.g., an asset which may refer to cryptocurrency, fiat, and/or a combination thereof, to name a few) and/or a basket of currency (e.g., one or more types of currency at a constant predetermined ratio). For example, the requester may want to obtain stable value digital asset in exchange for one or more of: fiat (as described in connection with FIGS. 14A-14G) and/or digital asset (as described in connection with FIGS. 14A-14G, 14A-1, and 14D-1).

Figure 14A:
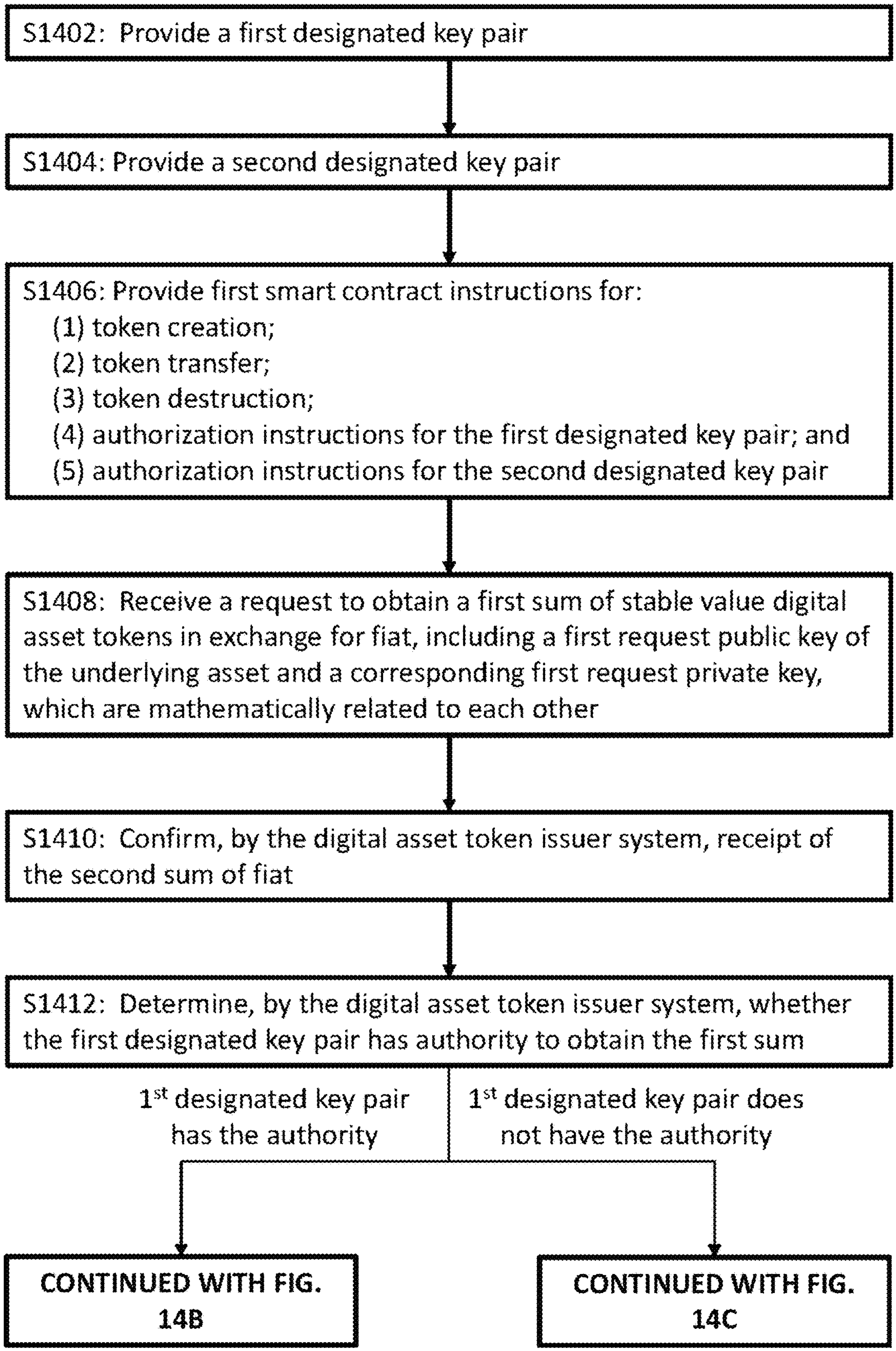
Figures 1, 14A:
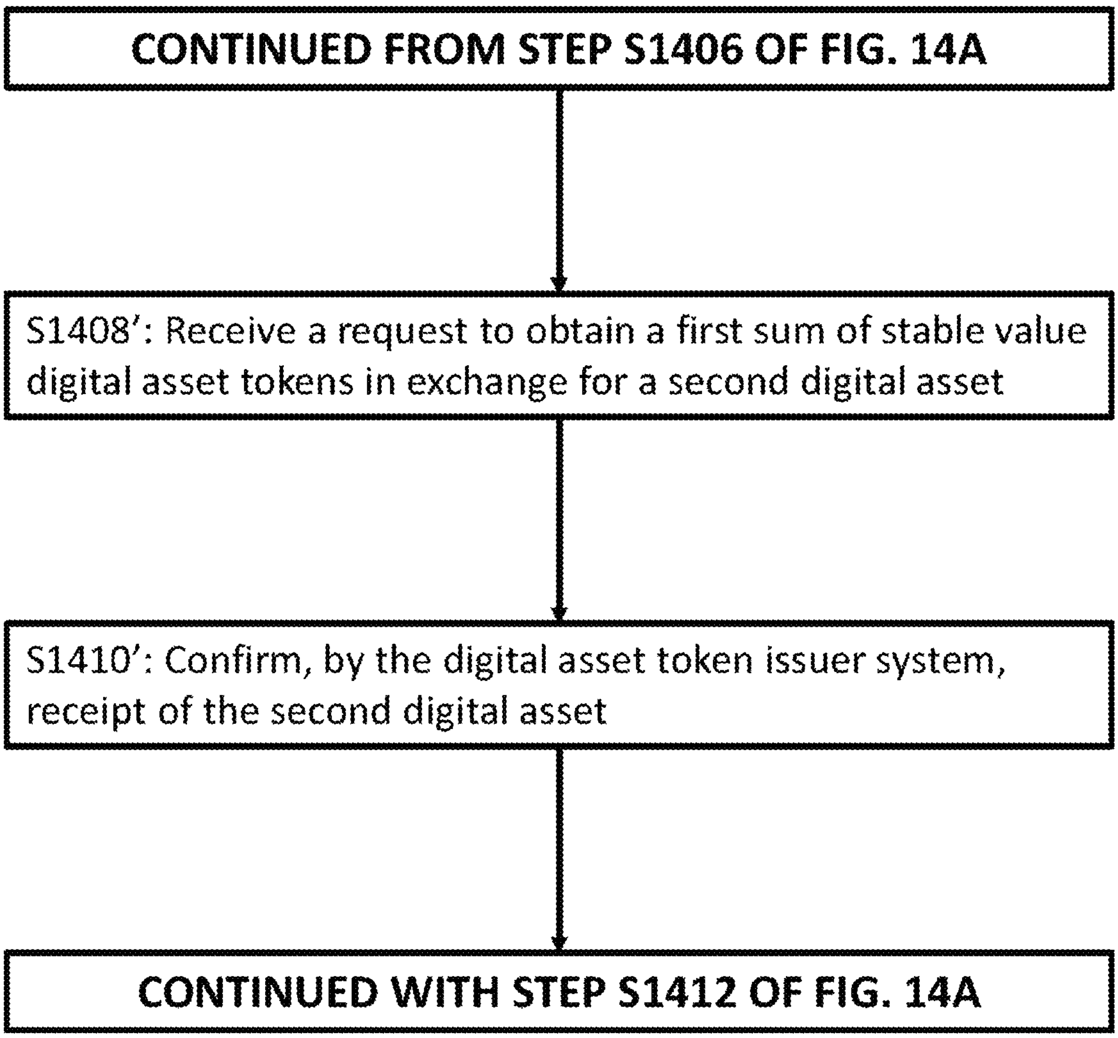

Referring to FIG. 14A, in embodiments, a digital asset token issuer may issue a sum of stable value digital asset tokens (e.g., in response to a request to obtain the sum of stable value digital asset tokens) An exemplary process for issuing stable value digital asset tokens may begin at step S1402. At step S1402, in embodiments, a first designated key pair, including a first designated public key of an underlying digital asset and a corresponding first designated private key, which is mathematically related, is provided. The underlying digital asset may be maintained on a distributed public transaction ledger maintained by a plurality of geographically distributed computer systems in a peer-to-peer network in the form of the blockchain (such as the ETHEREUM blockchain or NEO blockchain). The first designated private key may be stored on a first computer system which is connected to the distributed public transaction ledger through the Internet (e.g., in a hot wallet).

In embodiments, the exemplary process for issuing a sum of stable value digital asset tokens may continue with step S1404. At step S1404, in embodiments, a second designated key pair, including a second designated public key of the underlying digital asset and a corresponding second designated private key, which is mathematically related, is provided. The second designated private key is stored on a second computer system which is physically separated from the first computer system and is not operatively or physically connected to the distributed public transaction ledger or the Internet (e.g., a cold wallet).

In embodiments, one or more additional off-line designated key pairs may also be provided (e.g., off-line keyset 1 1803 of FIG. 18A, the description of which applying herein).

In embodiments, the exemplary process for issuing a sum of stable value digital asset tokens may continue with step S1406. At step S1406, in embodiments, first smart contract instructions for a stable value digital asset token associated with a first contract address associated with the underlying digital asset are also provided. The smart contract instructions are saved in the blockchain for the underlying digital assets and include instructions for: (1) token creation; (2) token transfer; (3) token destruction; (4) authorization instructions for the first designated key pair; and (5) authorization instructions for the second designated key pair. In embodiments, these smart contract instructions may be contained in one or a plurality of contract addresses, as discussed above.

In embodiments, the exemplary process for issuing a sum of stable value digital asset tokens may continue with step S1408. At step S1408, in embodiments, a request to obtain a first sum of stable value digital asset tokens in exchange for fiat is received (e.g., by the digital asset token issuer system from a requester device associated with the requester). In embodiments, a digital asset token issuer system receives a request from a first requesting user to obtain a first sum of stable value digital asset tokens in exchange for a second sum of fiat. The first sum corresponds to the second sum based on a fixed ratio of stable value digital asset token to fiat (e.g., 1 SVCoin Token=1 USD). The first requesting user is associated with an associated first requester key pair, including a first request public key of the underlying asset and a corresponding first request private key, which are mathematically related to each other. In embodiments, the received request may be received via a secure channel, such as an encrypted communication. For example, communications may be encrypted using an asymmetric key, such as a PKI key, and/or using a symmetric key, such as used in TLS, to name a few. The request, in embodiments, may be encrypted by the sender (e.g., the requester device associated with the requester) and/or the recipient (e.g., the digital asset token issuer system), to name a few.

In embodiments, the exemplary process for issuing a sum of stable value digital asset tokens may continue with step S1410. At step S1410, in embodiments, the digital asset token issuer system may confirm receipt of the second sum of fiat. In embodiments, the digital asset token issuer system may confirm the balance of the first user (e.g., a fiat balance associated with the requester) does not include the second sum of fiat. The digital asset token issuer system may confirm, in embodiments, a fiat balance associated with the digital asset token issuer system has increased by the second sum of fiat.

In embodiments, as discussed above, digital asset token issuer system may receive a request to obtain a first sum of stable value digital asset tokens in exchange for a second sum of second digital asset. In embodiments, the stable value digital asset may be pegged to the second digital asset. For example, the first sum may to the second sum based on a fixed ratio of stable value digital asset token to second digital asset (e.g., 1 Stable Value Digital Asset Token=1 Second Digital Asset). In such embodiments, steps S1408 and S1410 of FIG. 14A may be replaced by steps S1408' and S1410' of FIG. 14A-1. Referring to FIG. 14A-1, in embodiments, the digital asset token issuer system, at step S1408', may receive a request to obtain a first sum of stable value digital asset tokens in exchange for a second digital asset. In embodiments, the received request may be received via a secure channel, such as an encrypted communication. For example, communications may be encrypted using an asymmetric key, such as a PKI key, and/or using a symmetric key, such as used in TLS, to name a few. The request, in embodiments, may be encrypted by the sender (e.g., the requester device associated with the requester) and/or the recipient (e.g., the digital asset token issuer system), to name a few.

In embodiments, the received request to obtain stable value digital asset tokens (e.g., in connection with FIG. 14A and/or FIG. 14A-1) may be verified by the digital asset token issuer system. In embodiments, the digital asset token issuer system may verify the electronic request by determining whether the requester has sufficient funds (e.g., second sum of fiat, second sum of second digital asset, to name a few) to complete the transaction. The determination of whether the first user has sufficient funds to complete the transaction, in embodiments, may be based on reference to an electronic ledger associated with the digital asset token issuer system (e.g., transaction ledger 115). Sufficient funds, in embodiments, may account any associated fees with the transaction. For example, the request for the generation of 10 stable value digital asset tokens may require a deposit of 11 second digital assets (and/or 11 USD)—10 second digital assets (and/or 10 USD) for issuing the first sum of stable value digital asset token and 1 second digital asset (and/or 1 USD) for one or more fee(s) associated with the issuance of stable value digital asset tokens. If the received request is not verified, in embodiments, the digital asset token issuer system may generate and send a notification indicating the received request was denied which may include information indicating one or more reasons the received request was denied (e.g., insufficient funds, the requester is not authorized to complete the transaction, to name a few). In embodiments, the request may be verified.

In embodiments, the digital asset token issuer system may generate a first message including instructions to transfer the second sum of the second digital asset to a first designated public address associated with the digital asset token issuer system. The first message, in embodiments, may include machine-executable instructions which, when executed, display information on the first user device that indicates instructions to transfer the second sum of the second digital asset to the first designated public address. In embodiments, continuing the above example, the digital asset token issuer system may generate an electronic response to the requester's electronic request. The electronic response, in embodiments, may include instructions on how to transfer the second sum of second digital asset. For example, the electronic response may include information sufficient to indicate that the requester is to deposit the second sum of second digital asset into the first designated public address, which may be, in embodiments, represented by one or more of an alpha-numeric public address, and/or a QR code representation of the alpha-numeric public address, to name a few. In embodiments, such a message may be sent via a secure channel, such as an encrypted communication. For example, the message may be encrypted using an asymmetric key, such as a PKI key, and/or using a symmetric key, such as used in TLS, to name a few. The message, in embodiments, may be encrypted by the sender (e.g., the digital asset token issuer system) and/or the recipient (e.g., the requester device), to name a few. In embodiments, the message may be sent by the digital asset exchange computer system to the requester device. In embodiments, such a message may be made via a secure channel, such as an encrypted communication. For example, the message may be encrypted using an asymmetric key, such as a PKI key, or using a symmetric key, such as used in TLS, to name a few. The communication, in embodiments, may be encrypted by the sender (e.g., the digital asset token issuer system) and/or the recipient (e.g., the requester device), to name a few.

Continuing the process illustrated in connection with FIG. 14A-1, at step S1410', in embodiments, the digital asset token issuer system may confirm receipt of the second digital asset (e.g., at a designated address on a first blockchain, the designated address being associated with the digital asset token issuer system). The confirmation, in embodiments, may be based on reference to a distributed transaction ledger (e.g., a blockchain). In embodiments, the digital asset token issuer system may confirm that the first designated public address has received the second sum of second digital asset. The confirmation process may be a call/return to/from the designated public address. In embodiments, the confirmation process may be a query to the peer-to-peer network for a status of the distributed transaction ledger, which may result in a receipt of the status of the distributed transaction ledger which may include the transfer of the second amount of second digital assets.

Referring back to FIG. 14A, the process may continue with step S1412. At step S1412, in embodiments, the digital asset token issuer determines whether the first designated key pair has the authority to obtain the first sum of stable value digital assets. For example, a list of authorized (e.g., a whitelist) key pairs and/or a list of unauthorized (e.g., a blacklist) key pairs. Continuing the example, the digital asset token issuer system may determine whether the designated key pair is authorized by determining whether the designated key pair is on a whitelist (e.g., authorized) and/or whether the designated key pair is on a blacklist (e.g., not authorized). In embodiments where the first designated key pair has the authority to obtain the first sum of stable value digital asset tokens, the process may continue with FIG. 14B. In embodiments where the first designated key pair does not have the authority to obtain the first sum (e.g., on a blacklist, not authorized to issue the first sum, etc.) the process may continue with FIG. 14C.

Figure 14B:
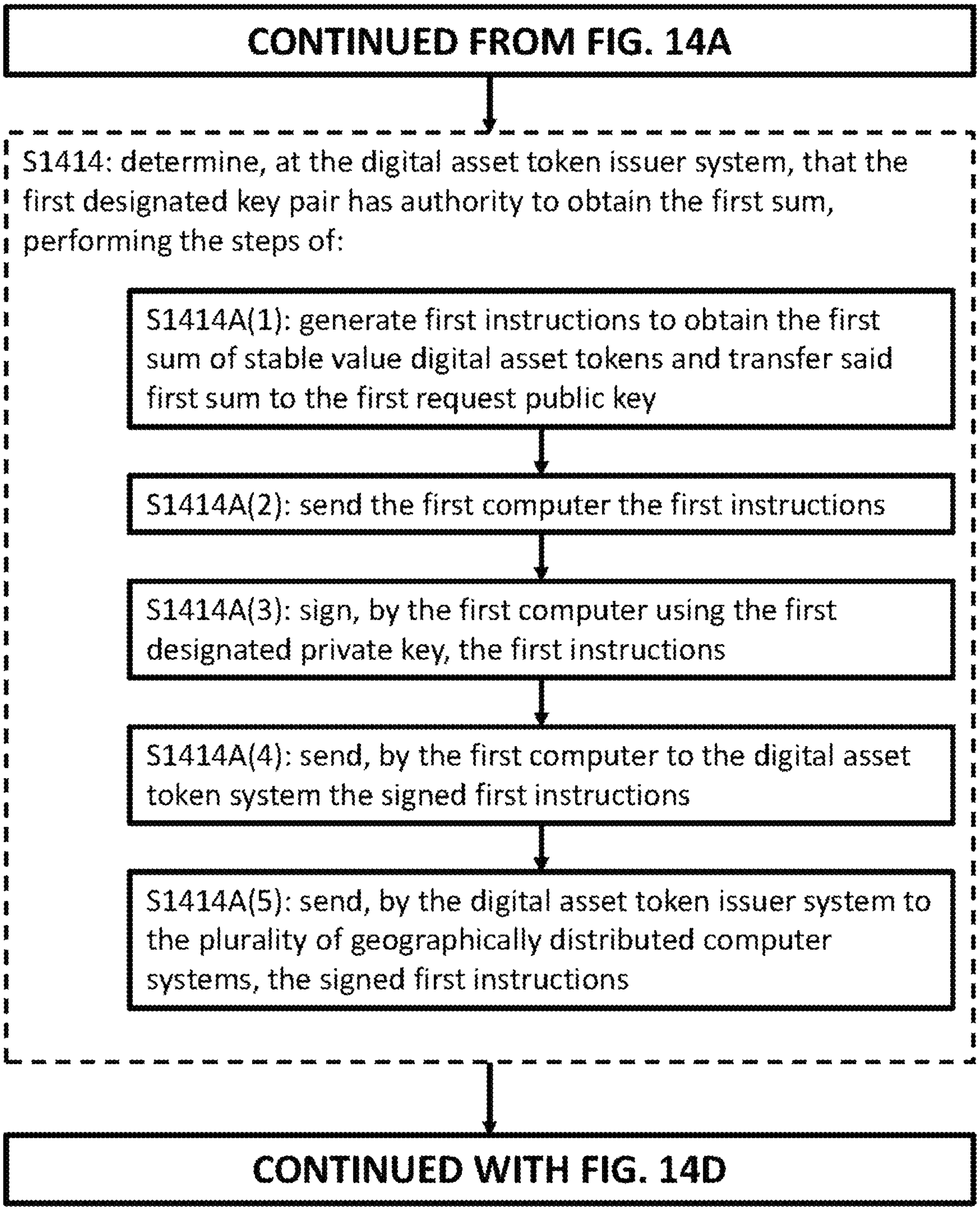

In embodiments, as noted above, the first designated key pair may have the authority to obtain the first sum of stable value digital asset tokens. Referring to FIG. 14B, the process for issuing a stable value digital asset may continue with step S1414. At step S1414, in embodiments, the digital asset token issuer system determines the first designated key pair has the authority to obtain the first sum by performing one or more of steps S1414A(1), S1414A(2), S1414A(3), S1414A(4), and/or S1414A(5). At step S1414A(1), in embodiments, the digital asset token issuer system, may generate first instructions from the first designated address to the contract address to obtain the first sum of stable value digital asset tokens and transfer said first sum to the first request public key. Continuing the process, at step S1414A (2), in embodiments, the digital asset token issuer system may send the first instructions to the first computer (e.g., via network 15). At step S1414A(3), in embodiments, the first computer digitally signs the first instructions using the first designated private key to generate first digitally signed instructions. In embodiments, the first instructions may be encrypted and/or digitally signed by the digital asset token issuer system (e.g., using a private key associated with the digital asset token issuer system, using the private key of the first designated key pair, to name a few) and/or digitally signed by the digital asset token issuer system and the requester device (e.g., via MPC). At step S1414A(4), in embodiments, the first computer may send, to the digital asset token system, the first digitally signed instructions (e.g., via network 15). At step S1414A(5), in embodiments, the digital asset token issuer system may send to the plurality of geographically distributed computer systems, the first digitally signed instructions. For example, the digital asset token issuer system may generate a first transaction request including the digitally signed instructions (the first transaction request, in embodiments, being digitally signed by the digital asset token issuer system and/or by the digital asset token issuer system and the requester device (e.g., via MPC)). The first transaction request, in embodiments, may be published to the blockchain by the digital asset token issuer system (e.g., published to the first designated public address on the blockchain). The published transaction request, continuing the example, may be verified by one or more nodes on the blockchain and/or executed by one or more nodes on the blockchain. In embodiments, a transaction fee may be required by one or more nodes, e.g., a miner, to verify and/or execute the generated and/or published transaction request.

Figure 14C:
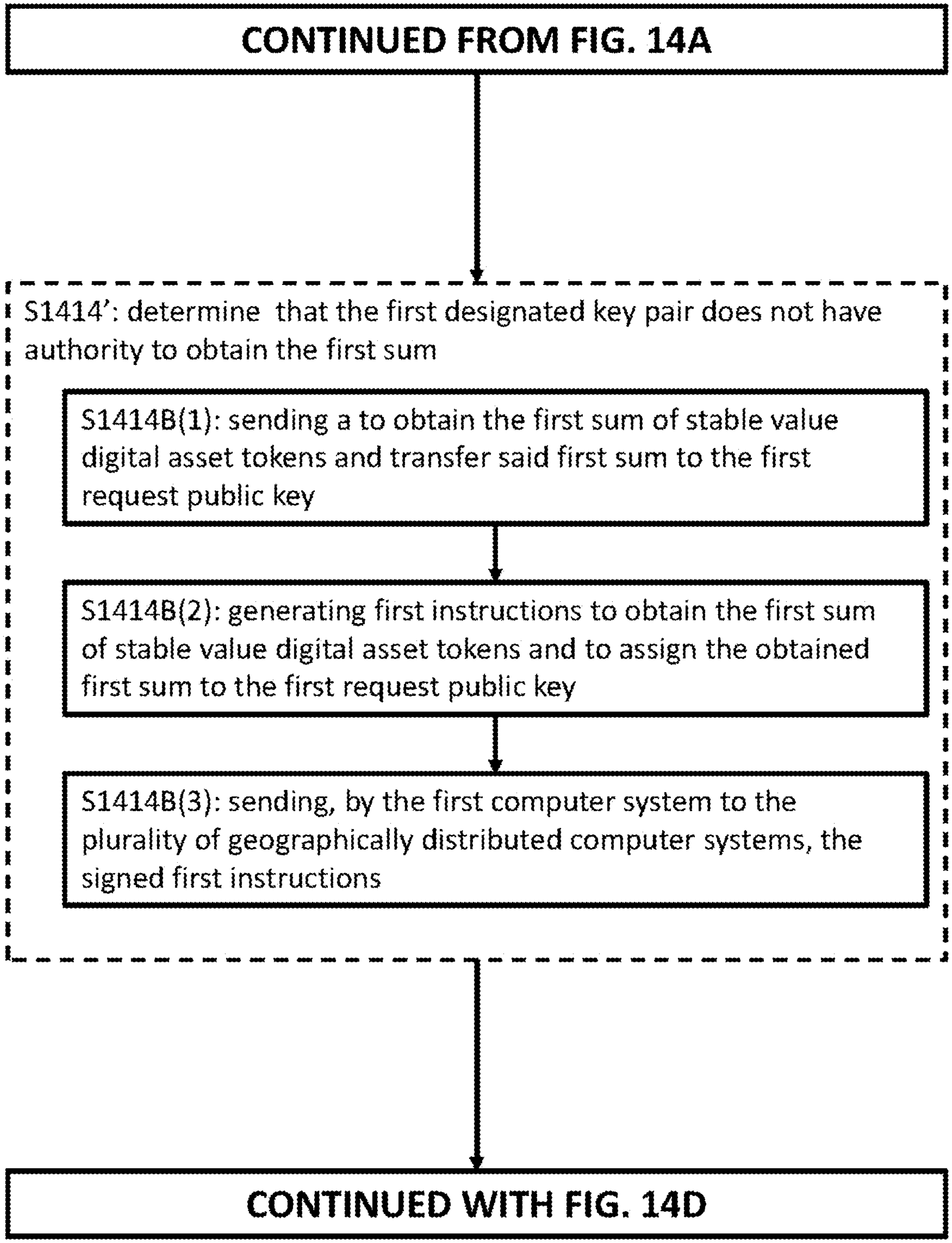
Figure 14D:
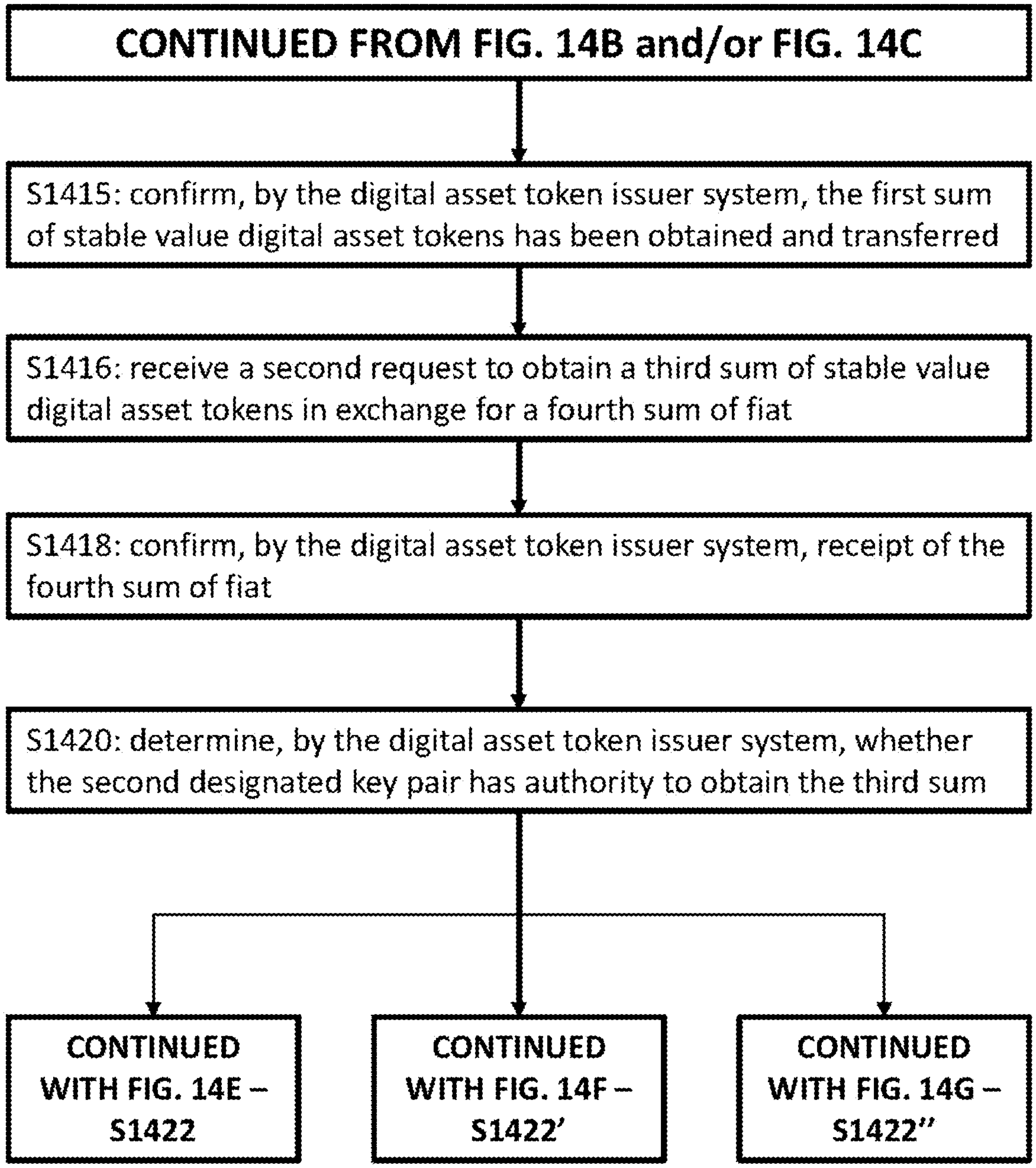
Figures 1, 14D:
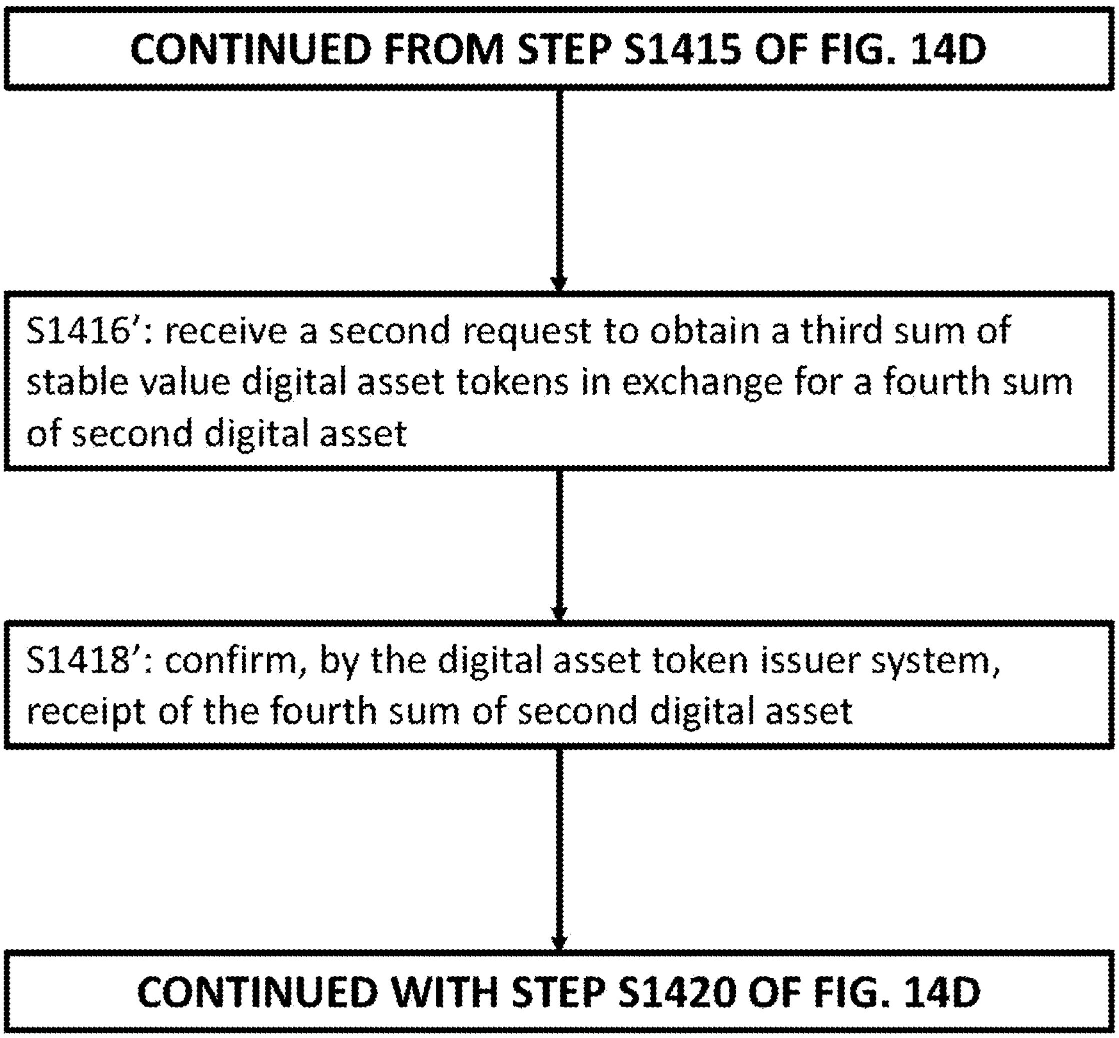

The process of issuing stable value digital asset tokens where the first designated key pair has the authority to obtain the first sum may continue with step S1415 of FIG. 14D. Referring to FIG. 14D, at step S1415, in embodiments, the digital asset token issuer system may confirm that the first sum of stable value digital asset tokens has been obtained and transferred to a public address associated with the requester (e.g., the public address associated with the first request public key associated with the requester) based on reference to the blockchain. For example, the digital asset token issuer system may generate and publish a call (which may be digitally signed in a similar manner as described above, the description of which applying herein) to the first designated public address (and/or another address which received the stable value digital asset tokens). The first designated public address may, continuing the example, respond by publishing a return on the blockchain. The return, in embodiments, may confirm the execution of the first transaction instructions (e.g., by returning a balance indicating the first sum of stable value tokens was issued to the first designated public address).

In embodiments, the exemplary process for issuing a sum of stable value digital asset tokens may continue with step S1416. At step S1416, in embodiments, a request to obtain a third sum of stable value digital asset tokens in exchange for fiat is received (e.g., by the digital asset token issuer system from a requester device associated with the requester). In embodiments, a digital asset token issuer system receives a request from a first requesting user to obtain a third sum of stable value digital asset tokens in exchange for a fourth sum of fiat. The third sum, similar to the first sum, corresponds to the second sum based on a fixed ratio of stable value digital asset token to fiat (e.g., 1 SVCoin Token=10 USD). In embodiments, the received request may be received via a secure channel, such as an encrypted communication. For example, communications may be encrypted using an asymmetric key, such as a PKI key, and/or using a symmetric key, such as used in TLS, to name a few. The request, in embodiments, may be encrypted by the sender (e.g., the requester device associated with the requester) and/or the recipient (e.g., the digital asset token issuer system), to name a few.

In embodiments, the exemplary process for issuing a sum of stable value digital asset tokens may continue with step S1418. At step S1418, in embodiments, the digital asset token issuer system may confirm receipt of the fourth sum of fiat. In embodiments, the digital asset token issuer system may confirm the balance of the first user (e.g., a fiat balance associated with the requester) does not include the fourth sum of fiat. The digital asset token issuer system may confirm, in embodiments, a fiat balance associated with the digital asset token issuer system has increased by the fourth sum of fiat.

In embodiments, as discussed above, digital asset token issuer system may receive a request to obtain a third sum of stable value digital asset tokens in exchange for a fourth sum of second digital asset. In embodiments, the stable value digital asset may be pegged to the second digital asset. For example, the third sum may to the fourth sum based on a fixed ratio of stable value digital asset token to second digital asset (e.g., 1 Stable Value Digital Asset Token=100 Second Digital Asset). In such embodiments, steps S1416 and S1418 of FIG. 14D may be replaced by steps S1416' and S1418' of FIG. 14D-1. Referring to FIG. 14D-1, in embodiments, the digital asset token issuer system, at step S1416', may receive a request to obtain a third sum of stable value digital asset tokens in exchange for a fourth digital asset. In embodiments, the received request may be received via a secure channel, such as an encrypted communication. For example, communications may be encrypted using an asymmetric key, such as a PKI key, and/or using a symmetric key, such as used in TLS, to name a few. The request, in embodiments, may be encrypted by the sender (e.g., the requester device associated with the requester) and/or the recipient (e.g., the digital asset token issuer system), to name a few.

In embodiments, the received request to obtain stable value digital asset tokens (e.g., in connection with FIG. 14D and/or FIG. 14D-1) may be verified by the digital asset token issuer system. In embodiments, the digital asset token issuer system may verify the request by determining whether the requester has sufficient funds (e.g., fourth sum of fiat, fourth sum of second digital asset, to name a few) to complete the transaction. The determination of whether the requester has sufficient funds to complete the transaction, in embodiments, may be based on reference to an electronic ledger associated with the digital asset token issuer system (e.g., transaction ledger 115). Sufficient funds, in embodiments, may account any associated fees with the transaction. For example, the request for the generation of 10 stable value digital asset tokens may require a deposit of 101 second digital assets (and/or 101 USD)—100 second digital assets (and/or 100 USD) for issuing the first sum of stable value digital asset token and 1 second digital asset (and/or 1 USD) for one or more fee(s) associated with the issuance of stable value digital asset tokens. If the received request is not verified, in embodiments, the digital asset token issuer system may generate and send a notification indicating the received request was denied which may include information indicating one or more reasons the received request was denied (e.g., insufficient funds, the requester is not authorized to complete the transaction, to name a few). In embodiments, the request may be verified.

In embodiments, the digital asset token issuer system may generate a second message including instructions to transfer the fourth sum of the second digital asset to a first designated public address associated with the digital asset token issuer system. The second message, in embodiments, may include machine-executable instructions which, when executed, display information on the first requester device that indicates instructions to transfer the fourth sum of the second digital asset to the first designated public address. In embodiments, continuing the above example, the digital asset token issuer system may generate an electronic response to the requester's electronic request. The electronic response, in embodiments, may include instructions on how to transfer the fourth sum of second digital asset. For example, the electronic response may include information sufficient to indicate that the requester is to deposit the fourth sum of second digital asset into the first designated public address, which may be, in embodiments, represented by one or more of an alpha-numeric public address, and/or a QR code representation of the alpha-numeric public address, to name a few. In embodiments, such a message may be sent via a secure channel, such as an encrypted communication. For example, the message may be encrypted using an asymmetric key, such as a PKI key, and/or using a symmetric key, such as used in TLS, to name a few. The message, in embodiments, may be encrypted by the sender (e.g., the digital asset token issuer system) and/or the recipient (e.g., the requester device), to name a few. In embodiments, the message may be sent by the digital asset exchange computer system to the requester device. In embodiments, such a message may be made via a secure channel, such as an encrypted communication. For example, the message may be encrypted using an asymmetric key, such as a PKI key, or using a symmetric key, such as used in TLS, to name a few. The communication, in embodiments, may be encrypted by the sender (e.g., the digital asset token issuer system) and/or the recipient (e.g., the requester device), to name a few.

Continuing the process illustrated in connection with FIG. 14D-1, at step S1418', in embodiments, the digital asset token issuer system may confirm receipt of the second digital asset (e.g., at a designated address on a first blockchain, the designated address being associated with the digital asset token issuer system). The confirmation, in embodiments, may be based on reference to a distributed transaction ledger (e.g., a blockchain). In embodiments, the digital asset token issuer system may confirm that the first designated public address has received the fourth sum of second digital asset. The confirmation process may be a call/return to/from the designated public address. In embodiments, the confirmation process may be a query to the peer-to-peer network for a status of the distributed transaction ledger, which may result in a receipt of the status of the distributed transaction ledger which may include the transfer of the fourth amount of second digital assets.

Referring back to FIG. 14D, the process for issuing stable value digital asset tokens may continue with step S1420. At step S1420, in embodiments, digital asset token issuer system, determines whether the first designated key pair has authority to obtain the third sum. The process, in embodiments, may continue with step S1422 of FIG. 14E, step S1422' of FIG. 14F, and/or step S1422" of FIG. 14G.

Figure 14E:
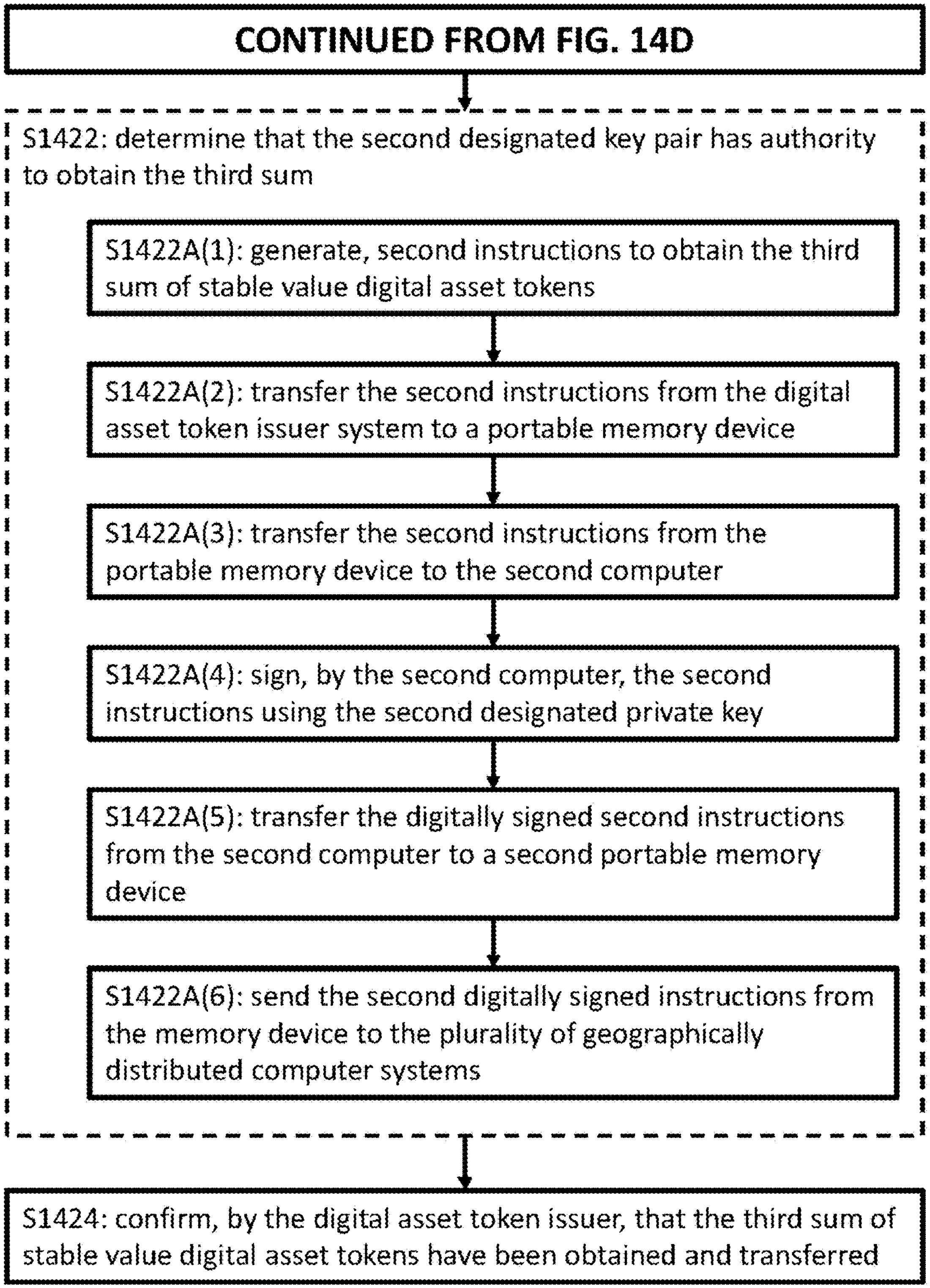

Referring to FIG. 14E, in embodiments where the digital asset token issuer system determines at step S1420 that the first designated key pair does not have authority to obtain the third sum, at step S1422, in embodiments, the digital asset token issuer system may determine whether the second designated key pair has authority to obtain the third sum. In embodiments, the determination of whether the second designated key pair is authorized may be determined by the digital asset token issuer by performing one or more of steps S1422A(1)-A(6). At Step S1422A(1), the digital asset token issuer system generates second instructions from the second designated address to the contract address to obtain the third sum of stable value digital asset tokens and transfer said third sum to the second request public key. At Step S1422A(2), the digital asset token issuer system transfers to a portable memory device, the second instructions. At step S1422A(3), the second instructions are transferred from the portable memory device to the second computer. At step S1422A(4), the second computer digitally signs the second instructions using the second designated private key to generate the second digitally signed instructions. At step S1422A(5), the second computer transfers to a second portable memory device, the second digitally signed instructions. At step S1422A(6), the second digitally signed instructions are sent from the second portable memory device to the plurality of geographically distributed computer systems. In embodiments, the second digitally signed instructions may be sent indirectly through another computer system.

Figure 14F:
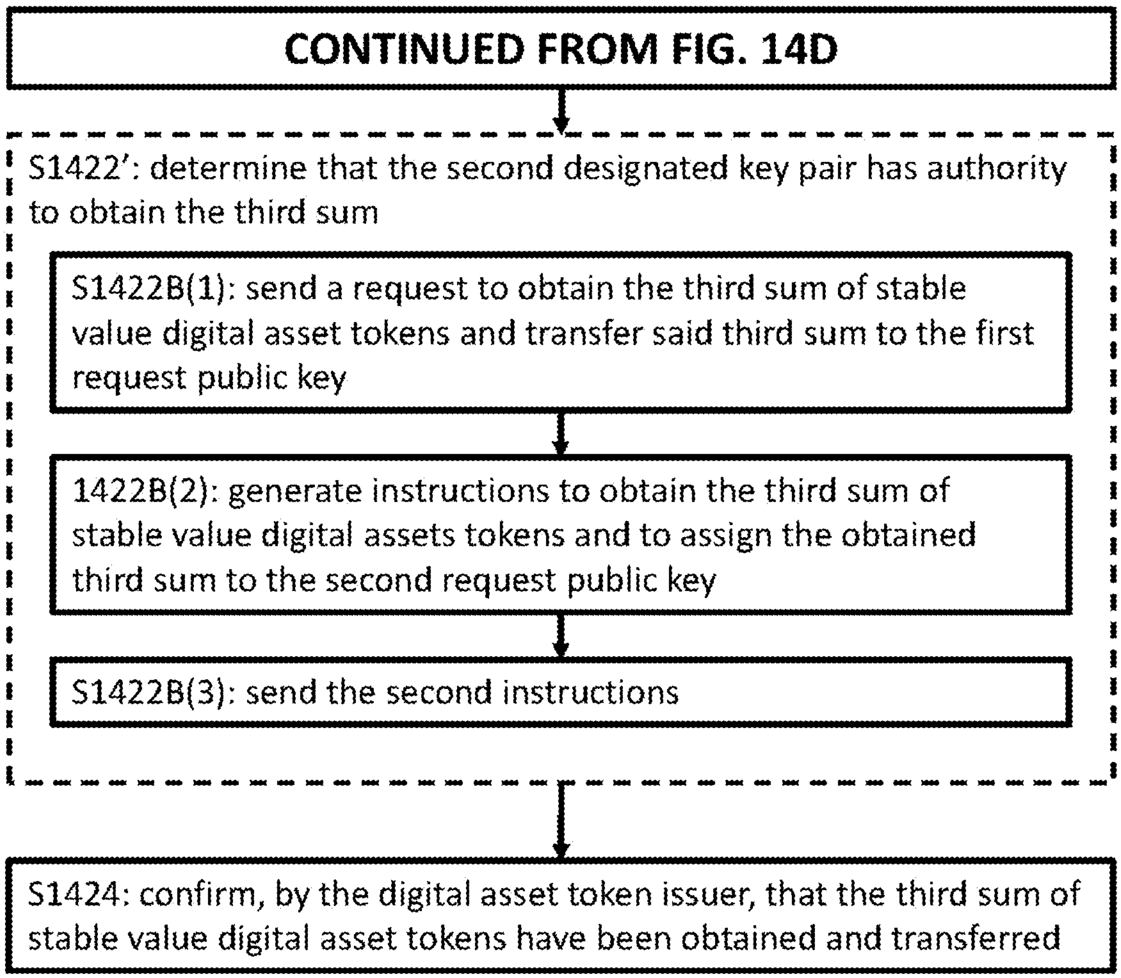

In embodiments the digital asset token issuer system may determine that the second designated key pair has the authority to obtain the third sum. In embodiments, the determination of whether the second designated key pair is authorized may be determined by the digital asset token issuer by performing one or more of steps S1422B(1)-B(3). Referring to FIG. 14F, in the case where the digital asset token issuer system determines at step S1422' that the second designated key pair has authority to obtain the third sum, in other embodiments, in step S1422', the system may perform the following steps S1422B(1)-B(3). In step S1422B(1), a request is sent from the digital asset token issuer system to the second computer, to obtain the third sum of stable value digital asset tokens and transfer said third sum to the first request public key. In Step S1422B(2), the second computer generates second instructions addressed from the second designated public key to the contract address including a message to obtain the third sum of stable value digital asset tokens and to assign the obtained third sum to the second request public key, the second instructions including a digital signature based on the second designated private key. In step 1422B(3), the second computer system sends to the plurality of geographically distributed computer systems, the second instructions. In embodiments, the second computer may send the second instructions indirectly through another computer system.

The processes of FIGS. 14E, 14F, and/or 14G may continue with step S1424 (as illustrated in connection with FIGS. 14E-14G). At step S1424, in embodiments, the digital asset token issuer system confirms that the third sum of stable value digital asset tokens have been obtained and transferred to the second request public key based on reference to the blockchain.

In embodiments, the step of sending, from the second portable memory device to the plurality of geographically distributed computer systems, the second digitally signed instructions comprises the further steps of transferring, from the second portable memory device to the digital asset computer system, the second digitally signed instructions; and transferring, from the digital asset computer system to the plurality of geographically distributed computer systems, the second digitally signed instructions.

Figure 14G:
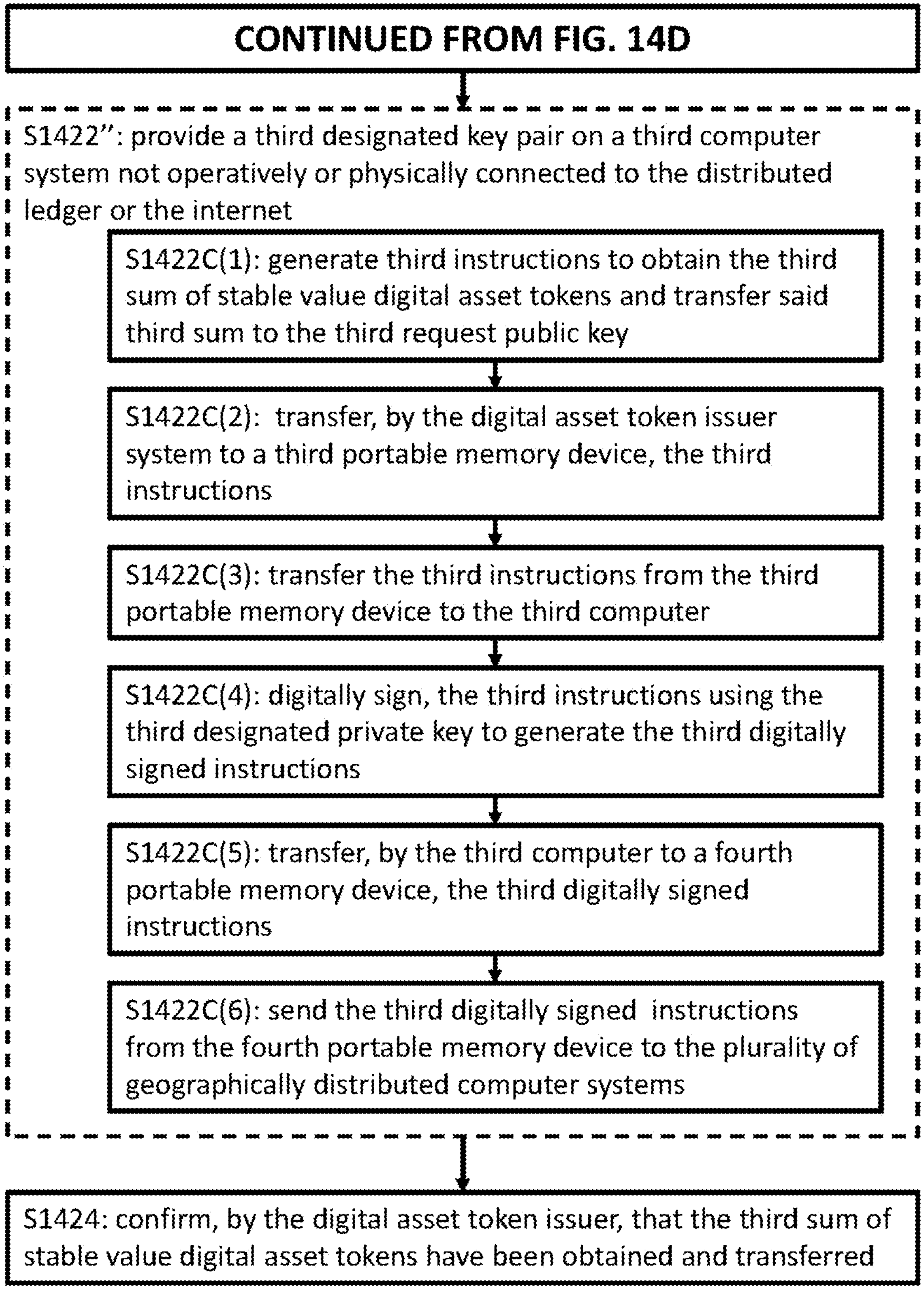

Referring to FIG. 14G, in embodiments, a third designated key pair, comprising a third designated public key of the underlying digital asset and a corresponding third designated private key that are mathematically related may be provided. The third designated private key may be stored on a third computer system which is physically separated from the first computer system and from the second computer system and is not operatively or physically connected to the distributed public transaction ledger or the Internet. In such embodiments, the first smart contract instructions further comprise authorization instructions for the third key pair. Further, in such embodiments, in the case where the digital asset token issuer system determines that the first designated key pair does not have authority to obtain the third sum, the method further comprises determining, by the digital asset token issuer system, whether the third designated key pair in addition to the second designated key pair have authority to obtain the third sum; and in the case where the digital asset token issuer system determines that the third designated key pair in addition to the second designated key pair have authority to obtain the third sum, perform the Steps S1422C(1)-C(6) as part of step S1422". In Step S1422C(1), the digital asset token issuer system may generate third instructions from the third designated address to the contract address to obtain the third sum of stable value digital asset tokens and transfer said third sum to the third request public key. In Step S1422C(2), the digital asset token issuer system may transfer to a third portable memory device, the third instructions. In Step S1422C(3), the third instructions may be transferred from the third portable memory device to the third computer. In Step S1422C(4), the third computer may digitally sign the third instructions using the third designated private key to generate the third digitally signed instructions. In Step S1422C(5), the third computer may transfer to a fourth portable memory device, the third digitally signed instructions. In Step S1422C(6), the third digitally signed instructions may be sent from the fourth portable memory device to the plurality of geographically distributed computer systems. In embodiments, the step of sending, from the fourth portable memory device to the plurality of geographically distributed computer systems, the third digitally signed instructions comprises the further steps of (i) transferring, from the fourth portable memory device to the digital asset computer system, the third digitally signed instructions; and (ii) transferring, from the digital asset computer system to the plurality of geographically distributed computer systems, the third digitally signed instructions. In embodiments, the first portable memory device and second portable memory device are the same portable memory device. In embodiments, the first portable memory device and second portable memory device are the different portable memory devices. In embodiments, the third portable memory device and fourth portable memory device are the same portable memory device. In embodiments, the third portable memory device and fourth portable memory device are the different portable memory devices.

Referring back to FIG. 14A, step S1412, in embodiments, the digital asset token issuer may determine the first designated key pair does not have the authority to obtain the first sum of stable value digital asset tokens. For example, the first designated key pair may have the authority to obtain a maximum of 10 stable value digital asset tokens (e.g., 10 in total, 10 over a predetermined amount of time—such as a day, week, etc.—etc.). Continuing the example, if the first sum is greater than the max of 10 stable value digital asset tokens, the first designated key pair may not have the authority not issue the first sum of stable value digital asset tokens. Referring to FIG. 14C, as noted above, the process for issuing stable value digital asset tokens may continue with step S1414'. In embodiments, at step S1414', the system may perform the steps S1414B(1)-B(3). At step S1414B(1), in embodiments, a request is sent from the digital asset token issuer system to the first computer, to obtain the first sum of stable value digital asset tokens and transfer said first sum to the first request public key. In embodiments, the request may be sent via a secure channel, such as an encrypted communication. For example, communications may be encrypted using an asymmetric key, such as a PKI key, and/or using a symmetric key, such as used in TLS, to name a few. The request, in embodiments, may be encrypted by the sender (e.g., the digital asset token issuer system) and/or the recipient (e.g., the first computer), to name a few. Step S1414', in embodiments, may continue with step S1414B(2). At step S1414B(2), in embodiments the first computer generates first instructions addressed from the first designated public key to the contract address including a message to obtain the first sum of stable value digital asset tokens and to assign the obtained first sum to the first request public key, the first instructions including a digital signature based on the first designated private key. In embodiments, the first instructions may be encrypted and/or digitally signed by the digital asset token issuer system (e.g., using a private key associated with the digital asset token issuer system, using the private key of the first designated key pair, to name a few) and/or digitally signed by the digital asset token issuer system and the first computer (e.g., via MPC). In embodiments, at step 1414B(3), the first computer system sends to the plurality of geographically distributed computer systems, the first instructions. In embodiments, the first computer may send the first instructions indirectly through another computer system. For example, the digital asset token issuer system may generate a second transaction request including the digitally signed instructions (the second transaction request, in embodiments, being digitally signed by the digital asset token issuer system and/or by the digital asset token issuer system and the first computer (e.g., via MPC)). The second transaction request, in embodiments, may be published to the blockchain by the digital asset token issuer system (e.g., published to the first designated public address on the blockchain). The published transaction request, continuing the example, may be verified by one or more nodes on the blockchain and/or executed by one or more nodes on the blockchain. In embodiments, a transaction fee may be required by one or more nodes, e.g., a miner, to verify and/or execute the generated and/or published transaction request. In embodiments, where the first designated key pair does not have the authority to issue the first sum of stable value digital asset tokens, the process may end here. In embodiments, the process, as illustrated in connection with FIG. 14C, may continue with FIG. 14D, described above, the description of which applying herein.

In embodiments, a method of obtaining stable value digital asset tokens may comprise the steps of: (a) providing a first designated key pair comprising a first designated public key and a corresponding first designated private key, wherein the first designated private key also corresponds to a first designated public address associated with an underlying digital asset, wherein the underlying digital asset is maintained on a distributed public transaction ledger by a first plurality of geographically distributed computer systems in a first peer-to-peer network in the form of a first blockchain, and wherein the first designated private key is stored on a first computer system which is connected via the Internet to the first peer-to-peer network; (b) providing a second designated key pair comprising a second designated public key and a corresponding second designated private key, wherein the second designated private key also corresponds to a second designated public address associated with the underlying digital asset; and wherein the second designated private key is stored on a second computer system which is physically separated from the first computer system and is not operatively or physically connected to the first peer-to-peer network; (c) providing first smart contract instructions for a stable value digital asset token associated with a first contract address associated with the underlying digital asset, wherein the smart contract instructions are saved as part of the first blockchain for the underlying digital asset and include: (1) token creation instructions including instructions to create tokens; (2) token transfer instructions including instructions to transfer tokens; (3) token destruction instructions including instructions to destroy tokens; (4) authorization instructions associated with the first designated key pair; and (5) authorization instructions associated with the second designated key pair; (d) receiving, by an administrator system, a request to obtain a first sum of stable value digital asset tokens in exchange for a second sum of a second digital asset, wherein the second digital asset is maintained on a second distributed public transaction ledger maintained by a second plurality of geographically distributed computer systems in a second peer-to-peer network in the form of a second blockchain; wherein the first sum corresponds to the second sum based on a fixed ratio of stable value digital asset token to second digital asset, and wherein the request comes from a first requesting user with an associated first requester key pair, comprising a first requester public key and a corresponding first requester private key, wherein the first requester private key also corresponds to a first requester public address associated with the underlying digital asset; (e) confirming, by the administrator system, receipt of the second sum of the second digital asset on the second blockchain; (f) transferring the first sum of stable value digital asset tokens to the first requester public address using the following steps: (1) sending a second request, from the administrator system to the first computer system, to obtain the first sum of stable value digital asset tokens and transfer said first sum to the first requester public address; (2) generating, by the first computer system, first instructions addressed from the first designated public address to the first contract address including a message to obtain the first sum of stable value digital asset tokens and to assign the obtained first sum to the first requester public address; (3) digitally signing, by the first computer system, the first instructions using the first designated private key to generate first digitally signed instructions; and (4) sending, from the first computer system to the first plurality of geographically distributed computer systems, the first digitally signed instructions, wherein the first digitally signed instructions are executed by the first plurality of geographically distributed computer systems in accordance with the first contract instructions; and (g) confirming, by the administrator system, that the first sum of stable value digital asset tokens has been obtained and transferred to the first requester public address based on reference to the first blockchain.

In embodiments, the method further comprises the steps of: (h) receiving, by the administrator system, a third request to obtain a third sum of stable value digital asset tokens in exchange for a fourth sum of the second digital asset, wherein the third sum corresponds to the fourth sum based on a second fixed notional amount, wherein the third request comes from a second requesting user with an associated second requester key pair, comprising a second requester public key and a corresponding second requester private key, and wherein the second requester private key is associated with a second requester public address associated with the underlying digital asset; (i) confirming, by the administrator system, receipt of the fourth sum of the second digital asset; (j) transferring the third sum of stable value digital asset tokens to the second requester public address using the following steps: (1) generating, by the administrator system, second instructions from the second designated public address to the first contract address to obtain the third sum of stable value digital asset tokens and transfer said third sum to the second requester public address; (2) transferring, from the administrator system to a first portable memory device, the second instructions; (3) transferring, from the first portable memory device to the second computer, the second instructions; (4) digitally signing, by the second computer, the second instructions using the second designated private key to generate second digitally signed instructions; (5) transferring, from the second computer to a second portable memory device, the second digitally signed instructions; and (6) sending, from the second portable memory device to the first plurality of geographically distributed computer systems, the second digitally signed instructions; and (k) confirming, by the administrator system, that the third sum of stable value digital asset tokens have been obtained and transferred to the second requester public address based on reference to the first blockchain.

In embodiments, the step of (j)(6) includes steps of: (i) transferring, from the second portable memory device to the administrator system, the second digitally signed instructions; and (ii) transferring, from the administrator system to the plurality of geographically distributed computer systems, the second digitally signed instructions.

In embodiments, the method further comprises the steps of: (l) providing a third designated key pair comprising a third designated public key and a corresponding third designated private key, wherein the third designated private key is stored on a third computer system which is physically separated from the first computer system and the second computer system, wherein the third computer system is not operatively connected or physically connected to the peer-to-peer network, and wherein the first smart contract instructions further include: (6) authorization instructions associated with the third designated key pair, and wherein, with respect to step (j), performing the following further steps: (7) determining that the first designated key pair does not have authority to obtain the third sum of stable value digital asset tokens; (8) determining, by the administrator system, the third designated key pair and the second designated key pair together have authority to obtain the third sum; (9) generating, by the administrator system, third instructions from the third designated public address to the first contract address to obtain the third sum of stable value digital asset tokens and transfer said third sum to the second requester public address; (10) transferring, from the administrator system to a third portable memory device, the third instructions; (11) transferring, from the third portable memory device to the third computer system, the third instructions; (12) digitally signing, by the third computer system, the third instructions using the third designated private key to generate third digitally signed instructions; (13) transferring, from the third computer system to a fourth portable memory device, the third digitally signed instructions; and (14) sending, from the fourth portable memory device to the first plurality of geographically distributed computer systems, the third digitally signed instructions.

In embodiments, step (j)(14) includes the steps of: (A) transferring, from the fourth portable memory device to the administrator system, the third digitally signed instructions; and (B) transferring, from the administrator system to the plurality of geographically distributed computer systems, the third digitally signed instructions.

In embodiments, the third portable memory device and fourth portable memory device are the same portable memory device.

In embodiments, the third portable memory device and fourth portable memory device are different portable memory devices.

In embodiments, the first portable memory device and second portable memory device are the same portable memory device.

In embodiments, the first portable memory device and second portable memory device are different portable memory devices.

In embodiments, the method further includes the steps of: (l) providing a third designated key pair comprising a third designated public key and a corresponding third designated private key, wherein the third designated private key is stored on a third computer system which is physically separated from the first computer system and the second computer system and wherein the third computer system is not operatively connected or physically connected to the first peer-to-peer network; and wherein the first smart contract instructions further include: (6) authorization instructions associated with the third key pair, and wherein with respect to step (j), performing the following further steps: (7) determining the first designated key pair does not have authority to obtain the third sum; (8) determining the first designated key pair does not have authority to obtain the third sum; (9) determining, by the administrator system, that the third designated key pair, the second designated key pair and the first designated key pair together have authority to obtain the third sum; (10) sending a fifth request, from the administrator system to the first computer system, to obtain the third sum of stable value digital asset tokens and transfer said third sum to the second requester public address; (11) generating, by the administrator system, third instructions from the third designated public address to the first contract address to obtain the third sum of stable value digital asset tokens and transfer said third sum to the second requester public address; (12) transferring, from the administrator system to a third portable memory device, the third instructions; (13) transferring, from the third portable memory device to the third computer system, the third instructions; (14) digitally signing, by the third computer system, the third instructions using the third designated private key to generate third digitally signed instructions; (15) transferring, from the third computer system to a fourth portable memory device, the third digitally signed instructions, and (16) sending, from the fourth portable memory device to the first plurality of geographically distributed computer systems, the third digitally signed instructions.

In embodiments, the step (j)(16) includes the steps of: (A) transferring, from the fourth portable memory device to the administrator system, the third digitally signed instructions; and (B) transferring, from the administrator system to the plurality of geographically distributed computer systems, the third digitally signed instructions.

In embodiments, the fourth sum of the second digital asset is deposited into one or more public addresses on the second blockchain associated with the administrator.

In embodiments, the fourth sum of the second digital asset is used by the administrator to purchase one or more interest bearing financial instruments.

In embodiments, the method further includes the steps of: (l) generating, by a first requester computing device associated with the first requester, a transfer message to transfer stable value digital asset tokens to the second requester public address, the transfer message including: (1) a transfer number of stable value digital asset tokens; (2) the first requester public address; (3) the second requester public address; and (4) an electronic signature based on the first requester private key; (m) publishing, by the first requester computing device to the to the first plurality of geographically distributed computer systems, the transfer message; and (n) confirming, by the first requester computing device, the transfer of the transfer number of stable value digital asset tokens from the first requester public address to the second requester public address by reference to the first blockchain.

In embodiments, the authorization instructions associated with the first designated key pair include a limit on a number of tokens the first designated key pair is authorized to issue.

In embodiments, the authorization instructions associated with the first designated key pair include a time limit during which the first designated key pair is authorized to issue tokens.

In embodiments, the authorization instructions associated with the first designated key pair include a limit on a number of tokens the first designated key pair is authorized to issue over a period of time.

In embodiments, the second digital asset is Bitcoin.

In embodiments, the second digital asset is Bitcoin Cash.

In embodiments, the second digital asset is Stellar.

In embodiments, the second digital asset is Filecoin.

In embodiments, the second digital asset is Litecoin.

In embodiments, the second digital asset is Tezos.

In embodiments, the second digital asset is Zcash.

In embodiments, the first designated public key is mathematically associated with the first designated private key.

In embodiments, the second designated public key is mathematically associated with the second designated private key.

In embodiments, the first contract instructions are based on the ERC720 standard.

In embodiments, the first blockchain is an Ethereum blockchain.

In embodiments, the first blockchain is a NEO blockchain.

In embodiments, the first blockchain is an Ether Classic blockchain.

In embodiments, the first request to obtain the first sum of stable value digital asset tokens specifies a requester fee payable to the administrator system in addition to the second sum of the second digital asset and step (e) includes confirming, by the administrator system, receipt of the second sum of the second digital asset and the requester fee.

In embodiments, the first request to obtain the first sum of stable value digital asset tokens specifies a miner fee payable to miners associated with the first plurality of geographically distributed computer systems and step (e) includes confirming, by the administrator system, receipt of the second sum of the second digital asset and the miner fee.

In embodiments, a method of obtaining stable value digital asset tokens may comprise the steps of: (a) providing a first designated key pair comprising a first designated public key and a corresponding first designated private key, wherein the first designated private key also corresponds to a first designated public address associated with an underlying digital asset, wherein the underlying digital asset is maintained on a distributed public transaction ledger by a first plurality of geographically distributed computer systems in a first peer-to-peer network in the form of a first blockchain, and wherein the first designated private key is stored on a first computer system which is connected via the Internet to the first peer-to-peer network; (b) providing a second designated key pair comprising a second designated public key and a corresponding second designated private key, wherein the second designated private key also corresponds to a second designated public address associated with the underlying digital asset; and wherein the second designated private key is stored on a second computer system which is physically separated from the first computer system and is not operatively or physically connected to the first peer-to-peer network; (c) providing first smart contract instructions for a stable value digital asset token associated with a first contract address associated with the underlying digital asset, wherein the smart contract instructions are saved as part of the first blockchain for the underlying digital asset and include: (1) token creation instructions including instructions to create tokens; (2) token transfer instructions including instructions to transfer tokens; (3) token destruction instructions including instructions to destroy tokens; (4) authorization instructions associated with the first designated key pair; and (5) authorization instructions associated with the second designated key pair; (d) receiving, by a digital asset exchange system, a request to obtain a first sum of stable value digital asset tokens in exchange for a second sum of a second digital asset, wherein the second digital asset is maintained on a second distributed public transaction ledger maintained by a second plurality of geographically distributed computer systems in a second peer-to-peer network in the form of a second blockchain; wherein the first sum corresponds to the second sum based on a fixed ratio of stable value digital asset token to second digital asset, and wherein the request comes from a first requesting user with an associated first requester key pair, comprising a first requester public key and a corresponding first requester private key, wherein the first requester private key also corresponds to a first requester public address associated with the underlying digital asset; (e) confirming, by the digital asset exchange system, receipt of the second sum of the second digital asset on the second blockchain; (f) transferring the first sum of stable value digital asset tokens to the first requester public address using the following steps: (1) sending a second request, from the digital asset exchange system to the first computer system, to obtain the first sum of stable value digital asset tokens and transfer said first sum to the first requester public address; (2) generating, by the first computer system, first instructions addressed from the first designated public address to the first contract address including a message to obtain the first sum of stable value digital asset tokens and to assign the obtained first sum to the first requester public address; (3) digitally signing, by the first computer system, the first instructions using the first designated private key to generate first digitally signed instructions; and (4) sending, from the first computer system to the first plurality of geographically distributed computer systems, the first digitally signed instructions, wherein the first digitally signed instructions are executed by the first plurality of geographically distributed computer systems in accordance with the first contract instructions; and (g) confirming, by the digital asset exchange system, that the first sum of stable value digital asset tokens has been obtained and transferred to the first requester public address based on reference to the first blockchain.

In embodiments, the method further comprises the steps of: (h) receiving, by the digital asset exchange system, a third request to obtain a third sum of stable value digital asset tokens in exchange for a fourth sum of the second digital asset, wherein the third sum corresponds to the fourth sum based on a second fixed notional amount, wherein the third request comes from a second requesting user with an associated second requester key pair, comprising a second requester public key and a corresponding second requester private key, and wherein the second requester private key is associated with a second requester public address associated with the underlying digital asset; (i) confirming, by the digital asset exchange system, receipt of the fourth sum of the second digital asset; (j) transferring the third sum of stable value digital asset tokens to the second requester public address using the following steps: (1) generating, by the digital asset exchange system, second instructions from the second designated public address to the first contract address to obtain the third sum of stable value digital asset tokens and transfer said third sum to the second requester public address; (2) transferring, from the digital asset exchange system to a first portable memory device, the second instructions; (3) transferring, from the first portable memory device to the second computer, the second instructions; (4) digitally signing, by the second computer, the second instructions using the second designated private key to generate second digitally signed instructions; (5) transferring, from the second computer to a second portable memory device, the second digitally signed instructions; and (6) sending, from the second portable memory device to the first plurality of geographically distributed computer systems, the second digitally signed instructions; and (k) confirming, by the digital asset exchange system, that the third sum of stable value digital asset tokens have been obtained and transferred to the second requester public address based on reference to the first blockchain.

In embodiments, the step of (j)(6) includes steps of: (i) transferring, from the second portable memory device to the digital asset exchange system, the second digitally signed instructions; and (ii) transferring, from the digital asset exchange system to the plurality of geographically distributed computer systems, the second digitally signed instructions.

In embodiments, the method further comprises the steps of: (l) providing a third designated key pair comprising a third designated public key and a corresponding third designated private key, wherein the third designated private key is stored on a third computer system which is physically separated from the first computer system and the second computer system, wherein the third computer system is not operatively connected or physically connected to the peer-to-peer network, and wherein the first smart contract instructions further include: (6) authorization instructions associated with the third designated key pair, and wherein, with respect to step (j), performing the following further steps: (7) determining that the first designated key pair does not have authority to obtain the third sum of stable value digital asset tokens; (8) determining, by the digital asset exchange system, the third designated key pair and the second designated key pair together have authority to obtain the third sum; (9) generating, by the digital asset exchange system, third instructions from the third designated public address to the first contract address to obtain the third sum of stable value digital asset tokens and transfer said third sum to the second requester public address; (10) transferring, from the digital asset exchange system to a third portable memory device, the third instructions; (11) transferring, from the third portable memory device to the third computer system, the third instructions; (12) digitally signing, by the third computer system, the third instructions using the third designated private key to generate third digitally signed instructions; (13) transferring, from the third computer system to a fourth portable memory device, the third digitally signed instructions; and (14) sending, from the fourth portable memory device to the first plurality of geographically distributed computer systems, the third digitally signed instructions.

In embodiments, step (j)(14) includes the steps of: (A) transferring, from the fourth portable memory device to the digital asset exchange system, the third digitally signed instructions; and (B) transferring, from the digital asset exchange system to the plurality of geographically distributed computer systems, the third digitally signed instructions.

In embodiments, the third portable memory device and fourth portable memory device are the same portable memory device.

In embodiments, the third portable memory device and fourth portable memory device are different portable memory devices.

In embodiments, the first portable memory device and second portable memory device are the same portable memory device.

In embodiments, the first portable memory device and second portable memory device are different portable memory devices.

In embodiments, the method further includes the steps of: (l) providing a third designated key pair comprising a third designated public key and a corresponding third designated private key, wherein the third designated private key is stored on a third computer system which is physically separated from the first computer system and the second computer system and wherein the third computer system is not operatively connected or physically connected to the first peer-to-peer network; and wherein the first smart contract instructions further include: (6) authorization instructions associated with the third key pair, and wherein with respect to step (j), performing the following further steps: (7) determining the first designated key pair does not have authority to obtain the third sum; (8) determining the first designated key pair does not have authority to obtain the third sum; (9) determining, by the digital asset exchange system, that the third designated key pair, the second designated key pair and the first designated key pair together have authority to obtain the third sum; (10) sending a fifth request, from the digital asset exchange system to the first computer system, to obtain the third sum of stable value digital asset tokens and transfer said third sum to the second requester public address; (11) generating, by the digital asset exchange system, third instructions from the third designated public address to the first contract address to obtain the third sum of stable value digital asset tokens and transfer said third sum to the second requester public address; (12) transferring, from the digital asset exchange system to a third portable memory device, the third instructions; (13) transferring, from the third portable memory device to the third computer system, the third instructions; (14) digitally signing, by the third computer system, the third instructions using the third designated private key to generate third digitally signed instructions; (15) transferring, from the third computer system to a fourth portable memory device, the third digitally signed instructions; and (16) sending, from the fourth portable memory device to the first plurality of geographically distributed computer systems, the third digitally signed instructions.

In embodiments, the step (j)(16) includes the steps of: (A) transferring, from the fourth portable memory device to the digital asset exchange system, the third digitally signed instructions; and (B) transferring, from the digital asset exchange system to the plurality of geographically distributed computer systems, the third digitally signed instructions.

In embodiments, the fourth sum of the second digital asset is deposited into one or more public addresses on the second blockchain associated with the digital asset exchange.

In embodiments, the fourth sum of the second digital asset is used by the digital asset exchange to purchase one or more interest bearing financial instruments.

In embodiments, the method further includes the steps of: (l) generating, by a first requester computing device associated with the first requester, a transfer message to transfer stable value digital asset tokens to the second requester public address, the transfer message including: (1) a transfer number of stable value digital asset tokens; (2) the first requester public address; (3) the second requester public address; and (4) an electronic signature based on the first requester private key; (m) publishing, by the first requester computing device to the to the first plurality of geographically distributed computer systems, the transfer message; and (n) confirming, by the first requester computing device, the transfer of the transfer number of stable value digital asset tokens from the first requester public address to the second requester public address by reference to the first blockchain.

In embodiments, the authorization instructions associated with the first designated key pair include a limit on a number of tokens the first designated key pair is authorized to issue.

In embodiments, the authorization instructions associated with the first designated key pair include a time limit during which the first designated key pair is authorized to issue tokens.

In embodiments, the authorization instructions associated with the first designated key pair include a limit on a number of tokens the first designated key pair is authorized to issue over a period of time.

In embodiments, the second digital asset is Bitcoin.

In embodiments, the second digital asset is Bitcoin Cash.

In embodiments, the second digital asset is Stellar.

In embodiments, the second digital asset is Filecoin.

In embodiments, the second digital asset is Litecoin.

In embodiments, the second digital asset is Tezos.

In embodiments, the second digital asset is Zcash.

In embodiments, the first designated public key is mathematically associated with the first designated private key.

In embodiments, the second designated public key is mathematically associated with the second designated private key.

In embodiments, the first contract instructions are based on the ERC720 standard.

In embodiments, the first blockchain is an Ethereum blockchain.

In embodiments, the first blockchain is a NEO blockchain.

In embodiments, the first blockchain is an Ether Classic blockchain.

In embodiments, the first request to obtain the first sum of stable value digital asset tokens specifies a requester fee payable to the digital asset exchange system in addition to the second sum of the second digital asset and step (e) includes confirming, by the digital asset exchange system, receipt of the second sum of the second digital asset and the requester fee.

In embodiments, the first request to obtain the first sum of stable value digital asset tokens specifies a miner fee payable to miners associated with the first plurality of geographically distributed computer systems and step (e) includes confirming, by the digital asset exchange system, receipt of the second sum of the second digital asset and the miner fee.

In embodiments, a method of obtaining stable value digital asset tokens may comprise the steps of: (a) providing a first designated key pair comprising a first designated public key and a corresponding first designated private key, wherein the first designated private key also corresponds to a first designated public address associated with an underlying digital asset, wherein the underlying digital asset is maintained on a distributed public transaction ledger by a first plurality of geographically distributed computer systems in a first peer-to-peer network in the form of a first blockchain, and wherein the first designated private key is stored on a first computer system which is connected via the Internet to the first peer-to-peer network; (b) providing a second designated key pair comprising a second designated public key and a corresponding second designated private key, wherein the second designated private key also corresponds to a second designated public address associated with the underlying digital asset; and wherein the second designated private key is stored on a second computer system which is physically separated from the first computer system and is not operatively or physically connected to the first peer-to-peer network; (c) providing first smart contract instructions for a stable value digital asset token associated with a first contract address associated with the underlying digital asset, wherein the smart contract instructions are saved as part of the first blockchain for the underlying digital asset and include: (1) token creation instructions including instructions to create tokens; (2) token transfer instructions including instructions to transfer tokens; (3) token destruction instructions including instructions to destroy tokens; (4) authorization instructions associated with the first designated key pair; and (5) authorization instructions associated with the second designated key pair; (d) receiving, by a digital asset token issuer system, a request to obtain a first sum of stable value digital asset tokens in exchange for a second sum of a second digital asset, wherein the second digital asset is maintained on a second distributed public transaction ledger maintained by a second plurality of geographically distributed computer systems in a second peer-to-peer network in the form of a second blockchain; wherein the first sum corresponds to the second sum based on a fixed ratio of stable value digital asset token to second digital asset, and wherein the request comes from a first requesting user with an associated first requester key pair, comprising a first requester public key and a corresponding first requester private key, wherein the first requester private key also corresponds to a first requester public address associated with the underlying digital asset; (e) confirming, by the digital asset token issuer system, receipt of the second sum of the second digital asset on the second blockchain; (f) transferring the first sum of stable value digital asset tokens to the first requester public address using the following steps: (1) sending a second request, from the digital asset token issuer system to the first computer system, to obtain the first sum of stable value digital asset tokens and transfer said first sum to the first requester public address; (2) generating, by the first computer system, first instructions addressed from the first designated public address to the first contract address including a message to obtain the first sum of stable value digital asset tokens and to assign the obtained first sum to the first requester public address; (3) digitally signing, by the first computer system, the first instructions using the first designated private key to generate first digitally signed instructions; and (4) sending, from the first computer system to the first plurality of geographically distributed computer systems, the first digitally signed instructions, wherein the first digitally signed instructions are executed by the first plurality of geographically distributed computer systems in accordance with the first contract instructions; and (g) confirming, by the digital asset token issuer system, that the first sum of stable value digital asset tokens has been obtained and transferred to the first requester public address based on reference to the first blockchain.

In embodiments, the method further comprises the steps of: (h) receiving, by the digital asset token issuer system, a third request to obtain a third sum of stable value digital asset tokens in exchange for a fourth sum of the second digital asset, wherein the third sum corresponds to the fourth sum based on a second fixed notional amount, wherein the third request comes from a second requesting user with an associated second requester key pair, comprising a second requester public key and a corresponding second requester private key, and wherein the second requester private key is associated with a second requester public address associated with the underlying digital asset; (i) confirming, by the digital asset token issuer system, receipt of the fourth sum of the second digital asset; (j) transferring the third sum of stable value digital asset tokens to the second requester public address using the following steps: (1) generating, by the digital asset token issuer system, second instructions from the second designated public address to the first contract address to obtain the third sum of stable value digital asset tokens and transfer said third sum to the second requester public address; (2) transferring, from the digital asset token issuer system to a first portable memory device, the second instructions; (3) transferring, from the first portable memory device to the second computer, the second instructions; (4) digitally signing, by the second computer, the second instructions using the second designated private key to generate second digitally signed instructions; (5) transferring, from the second computer to a second portable memory device, the second digitally signed instructions; and (6) sending, from the second portable memory device to the first plurality of geographically distributed computer systems, the second digitally signed instructions; and (k) confirming, by the digital asset token issuer system, that the third sum of stable value digital asset tokens have been obtained and transferred to the second requester public address based on reference to the first blockchain.

In embodiments, the step of (j)(6) includes steps of: (i) transferring, from the second portable memory device to the digital asset token issuer system, the second digitally signed instructions; and (ii) transferring, from the digital asset token issuer system to the plurality of geographically distributed computer systems, the second digitally signed instructions.

In embodiments, the method further comprises the steps of: (l) providing a third designated key pair comprising a third designated public key and a corresponding third designated private key, wherein the third designated private key is stored on a third computer system which is physically separated from the first computer system and the second computer system, wherein the third computer system is not operatively connected or physically connected to the peer-to-peer network, and wherein the first smart contract instructions further include: (6) authorization instructions associated with the third designated key pair, and wherein, with respect to step (j), performing the following further steps: (7) determining that the first designated key pair does not have authority to obtain the third sum of stable value digital asset tokens; (8) determining, by the digital asset token issuer system, the third designated key pair and the second designated key pair together have authority to obtain the third sum; (9) generating, by the digital asset token issuer system, third instructions from the third designated public address to the first contract address to obtain the third sum of stable value digital asset tokens and transfer said third sum to the second requester public address; (10) transferring, from the digital asset token issuer system to a third portable memory device, the third instructions; (11) transferring, from the third portable memory device to the third computer system, the third instructions; (12) digitally signing, by the third computer system, the third instructions using the third designated private key to generate third digitally signed instructions; (13) transferring, from the third computer system to a fourth portable memory device, the third digitally signed instructions; and (14) sending, from the fourth portable memory device to the first plurality of geographically distributed computer systems, the third digitally signed instructions.

In embodiments, step (j)(14) includes the steps of: (A) transferring, from the fourth portable memory device to the digital asset token issuer system, the third digitally signed instructions; and (B) transferring, from the digital asset token issuer system to the plurality of geographically distributed computer systems, the third digitally signed instructions.

In embodiments, the third portable memory device and fourth portable memory device are the same portable memory device.

In embodiments, the third portable memory device and fourth portable memory device are different portable memory devices.

In embodiments, the first portable memory device and second portable memory device are the same portable memory device.

In embodiments, the first portable memory device and second portable memory device are different portable memory devices.

In embodiments, the method further includes the steps of: (l) providing a third designated key pair comprising a third designated public key and a corresponding third designated private key, wherein the third designated private key is stored on a third computer system which is physically separated from the first computer system and the second computer system and wherein the third computer system is not operatively connected or physically connected to the first peer-to-peer network; and wherein the first smart contract instructions further include: (6) authorization instructions associated with the third key pair, and wherein with respect to step (j), performing the following further steps: (7) determining the first designated key pair does not have authority to obtain the third sum; (8) determining the first designated key pair does not have authority to obtain the third sum; (9) determining, by the digital asset token issuer system, that the third designated key pair, the second designated key pair and the first designated key pair together have authority to obtain the third sum; (10) sending a fifth request, from the digital asset token issuer system to the first computer system, to obtain the third sum of stable value digital asset tokens and transfer said third sum to the second requester public address; (11) generating, by the digital asset token issuer system, third instructions from the third designated public address to the first contract address to obtain the third sum of stable value digital asset tokens and transfer said third sum to the second requester public address; (12) transferring, from the digital asset token issuer system to a third portable memory device, the third instructions; (13) transferring, from the third portable memory device to the third computer system, the third instructions; (14) digitally signing, by the third computer system, the third instructions using the third designated private key to generate third digitally signed instructions; (15) transferring, from the third computer system to a fourth portable memory device, the third digitally signed instructions; and (16) sending, from the fourth portable memory device to the first plurality of geographically distributed computer systems, the third digitally signed instructions.

In embodiments, the step (j)(16) includes the steps of: (A) transferring, from the fourth portable memory device to the digital asset token issuer system, the third digitally signed instructions; and (B) transferring, from the digital asset token issuer system to the plurality of geographically distributed computer systems, the third digitally signed instructions.

In embodiments, the fourth sum of the second digital asset is deposited into one or more public addresses on the second blockchain associated with the digital asset token issuer.

In embodiments, the fourth sum of the second digital asset is used by the digital asset token issuer to purchase one or more interest bearing financial instruments.

In embodiments, the method further includes the steps of: (l) generating, by a first requester computing device associated with the first requester, a transfer message to transfer stable value digital asset tokens to the second requester public address, the transfer message including: (1) a transfer number of stable value digital asset tokens; (2) the first requester public address; (3) the second requester public address; and (4) an electronic signature based on the first requester private key; (m) publishing, by the first requester computing device to the to the first plurality of geographically distributed computer systems, the transfer message; and (n) confirming, by the first requester computing device, the transfer of the transfer number of stable value digital asset tokens from the first requester public address to the second requester public address by reference to the first blockchain.

In embodiments, the authorization instructions associated with the first designated key pair include a limit on a number of tokens the first designated key pair is authorized to issue.

In embodiments, the authorization instructions associated with the first designated key pair include a time limit during which the first designated key pair is authorized to issue tokens.

In embodiments, the authorization instructions associated with the first designated key pair include a limit on a number of tokens the first designated key pair is authorized to issue over a period of time.

In embodiments, the second digital asset is Bitcoin.

In embodiments, the second digital asset is Bitcoin Cash.

In embodiments, the second digital asset is Stellar.

In embodiments, the second digital asset is Filecoin.

In embodiments, the second digital asset is Litecoin.

In embodiments, the second digital asset is Tezos.

In embodiments, the second digital asset is Zcash.

In embodiments, the first designated public key is mathematically associated with the first designated private key.

In embodiments, the second designated public key is mathematically associated with the second designated private key.

In embodiments, the first contract instructions are based on the ERC720 standard.

In embodiments, the first blockchain is an Ethereum blockchain.

In embodiments, the first blockchain is a NEO blockchain.

In embodiments, the first blockchain is an Ether Classic blockchain.

In embodiments, the first request to obtain the first sum of stable value digital asset tokens specifies a requester fee payable to the digital asset token issuer system in addition to the second sum of the second digital asset and step (e) includes confirming, by the digital asset token issuer system, receipt of the second sum of the second digital asset and the requester fee.

In embodiments, the first request to obtain the first sum of stable value digital asset tokens specifies a miner fee payable to miners associated with the first plurality of geographically distributed computer systems and step (e) includes confirming, by the digital asset token issuer system, receipt of the second sum of the second digital asset and the miner fee.

In embodiments, a method of obtaining stable value digital asset tokens may comprise the steps of: (a) providing a first designated key pair comprising a first designated public key and a corresponding first designated private key, wherein the first designated private key also corresponds to a first designated public address associated with an underlying digital asset, wherein the underlying digital asset is maintained on a distributed public transaction ledger by a first plurality of geographically distributed computer systems in a first peer-to-peer network in the form of a first blockchain, and wherein the first designated private key is stored on a first computer system which is connected via the Internet to the first peer-to-peer network; (b) providing a second designated key pair comprising a second designated public key and a corresponding second designated private key, wherein the second designated private key also corresponds to a second designated public address associated with the underlying digital asset, and wherein the second designated private key is stored on a second computer system which is physically separated from the first computer system and is not operatively or physically connected to the first peer-to-peer network; (c) providing first smart contract instructions for a stable value digital asset token associated with a first contract address associated with the underlying digital asset, wherein the smart contract instructions are saved as part of the first blockchain for the underlying digital asset and include: (1) token creation instructions including instructions to create tokens; (2) token transfer instructions including instructions to transfer tokens; (3) token destruction instructions including instructions to destroy tokens; (4) authorization instructions associated with the first designated key pair; and (5) authorization instructions associated with the second designated key pair; (d) receiving, by an administrator system, a request to obtain a first sum of stable value digital asset tokens in exchange for a second sum of currency, wherein the first sum corresponds to the second sum based on a fixed ratio of the stable value digital asset token to the currency, wherein the request comes from a first requesting user with an associated first requester key pair, comprising a first requester public key and a corresponding first requester private key, and wherein the first requester private key also corresponds to a first requester public address associated with the underlying digital asset; (e) confirming, by the administrator system, receipt of the second sum of currency; (f) transferring the first sum of stable value digital asset tokens to the first requester public address using the following steps: (1) sending a second request, from the administrator system to the first computer system, to obtain the first sum of stable value digital asset tokens and transfer said first sum to the first requester public address; (2) generating, by the first computer system, first instructions addressed from the first designated public address to the first contract address including a message to obtain the first sum of stable value digital asset tokens and to assign the obtained first sum to the first requester public address; (3) digitally signing, by the first computer system, the first instructions using the first designated private key to generate first digitally signed instructions; and (4) sending, from the first computer system to the first plurality of geographically distributed computer systems, the first digitally signed instructions, wherein the first digitally signed instructions are executed by the first plurality of geographically distributed computer systems in accordance with the first contract instructions, and (g) confirming, by the administrator system, that the first sum of stable value digital asset tokens has been obtained and transferred to the first requester public address based on reference to the first blockchain.

In embodiments, the method further comprises the steps of: (h) receiving, by the administrator system, a third request to obtain a third sum of stable value digital asset tokens in exchange for a fourth sum of the currency, wherein the third sum corresponds to the fourth sum based on the fixed ratio of the stable value digital asset token to the currency, wherein the third request comes from a second requesting user with an associated second requester key pair, comprising a second requester public key and a corresponding second requester private key, and wherein the second requester private key is associated with a second requester public address associated with the underlying digital asset; (i) confirming, by the administrator system, receipt of the fourth sum of the second digital asset; (j) transferring the third sum of stable value digital asset tokens to the second requester public address using the following steps: (1) generating, by the administrator system, second instructions from the second designated public address to the first contract address to obtain the third sum of stable value digital asset tokens and transfer said third sum to the second requester public address; (2) transferring, from the administrator system to a first portable memory device, the second instructions; (3) transferring, from the first portable memory device to the second computer, the second instructions; (4) digitally signing, by the second computer, the second instructions using the second designated private key to generate second digitally signed instructions; (5) transferring, from the second computer to a second portable memory device, the second digitally signed instructions; and (6) sending, from the second portable memory device to the first plurality of geographically distributed computer systems, the second digitally signed instructions; and (k) confirming, by the administrator system, that the third sum of stable value digital asset tokens have been obtained and transferred to the second requester public address based on reference to the first blockchain.

In embodiments, the step of (j)(6) includes steps of: (i) transferring, from the second portable memory device to the administrator system, the second digitally signed instructions; and (ii) transferring, from the administrator system to the plurality of geographically distributed computer systems, the second digitally signed instructions.

In embodiments, the method further comprises the steps of: (l) providing a third designated key pair comprising a third designated public key and a corresponding third designated private key, wherein the third designated private key is stored on a third computer system which is physically separated from the first computer system and the second computer system and wherein the third computer system is not operatively connected or physically connected to the peer-to-peer network; wherein the first smart contract instructions further include: (6) authorization instructions associated with the third designated key pair; and wherein, with respect to step (j), performing the following further steps: (7) determining that the first designated key pair does not have authority to obtain the third sum of stable value digital asset tokens; (8) determining, by the administrator system, the third designated key pair and the second designated key pair together have authority to obtain the third sum; (9) generating, by the administrator system, third instructions from the third designated public address to the first contract address to obtain the third sum of stable value digital asset tokens and transfer said third sum to the second requester public address; (10) transferring, from the administrator system to a third portable memory device, the third instructions: (11) transferring, from the third portable memory device to the third computer system, the third instructions; (12) digitally signing, by the third computer system, the third instructions using the third designated private key to generate third digitally signed instructions; (13) transferring, from the third computer system to a fourth portable memory device, the third digitally signed instructions; and (14) sending, from the fourth portable memory device to the first plurality of geographically distributed computer systems, the third digitally signed instructions.

In embodiments, step (j)(14) includes the steps of: (A) transferring, from the fourth portable memory device to the administrator system, the third digitally signed instructions, and (B) transferring, from the administrator system to the plurality of geographically distributed computer systems, the third digitally signed instructions.

In embodiments, the third portable memory device and fourth portable memory device are the same portable memory device.

In embodiments, the third portable memory device and fourth portable memory device are different portable memory devices.

In embodiments, the first portable memory device and second portable memory device are the same portable memory device.

In embodiments, the first portable memory device and second portable memory device are different portable memory devices.

In embodiments, the method further includes the steps of: (l) providing a third designated key pair comprising a third designated public key and a corresponding third designated private key, wherein the third designated private key is stored on a third computer system which is physically separated from the first computer system and the second computer system and wherein the third computer system is not operatively connected or physically connected to the first peer-to-peer network; and wherein the first smart contract instructions further include: (6) authorization instructions associated with the third key pair; and wherein with respect to step (j), performing the following further steps: (7) determining the first designated key pair does not have authority to obtain the third sum; (8) determining the first designated key pair does not have authority to obtain the third sum; (9) determining, by the administrator system, that the third designated key pair, the second designated key pair and the first designated key pair together have authority to obtain the third sum; (10) sending a fifth request, from the administrator system to the first computer system, to obtain the third sum of stable value digital asset tokens and transfer said third sum to the second requester public address; (11) generating, by the administrator system, third instructions from the third designated public address to the first contract address to obtain the third sum of stable value digital asset tokens and transfer said third sum to the second requester public address; (12) transferring, from the administrator system to a third portable memory device, the third instructions; (13) transferring, from the third portable memory device to the third computer system, the third instructions; (14) digitally signing, by the third computer system, the third instructions using the third designated private key to generate third digitally signed instructions; (15) transferring, from the third computer system to a fourth portable memory device, the third digitally signed instructions; and (16) sending, from the fourth portable memory device to the first plurality of geographically distributed computer systems, the third digitally signed instructions.

In embodiments, the step (j)(16) includes the steps of: (A) transferring, from the fourth portable memory device to the administrator system, the third digitally signed instructions; and (B) transferring, from the administrator system to the plurality of geographically distributed computer systems, the third digitally signed instructions.

In embodiments, the fourth sum of the stable vale digital asset token is used by the administrator to purchase one or more interest bearing financial instruments.

In embodiments, the method further includes the steps of: (l) generating, by a first requester computing device associated with the first requester, a transfer message to transfer stable value digital asset tokens to the second requester public address, the transfer message including: (1) a transfer number of stable value digital asset tokens; (2) the first requester public address; (3) the second requester public address; and (4) an electronic signature based on the first requester private key; (m) publishing, by the first requester computing device to the to the first plurality of geographically distributed computer systems, the transfer message; and (n) confirming, by the first requester computing device, the transfer of the transfer number of stable value digital asset tokens from the first requester public address to the second requester public address by reference to the first blockchain.

In embodiments, the authorization instructions associated with the first designated key pair include a limit on a number of tokens the first designated key pair is authorized to issue.

In embodiments, the authorization instructions associated with the first designated key pair include a time limit during which the first designated key pair is authorized to issue tokens.

In embodiments, the authorization instructions associated with the first designated key pair include a limit on a number of tokens the first designated key pair is authorized to issue over a period of time.

In embodiments, the currency is fiat currency.

In embodiments, the fiat currency is U.S. Dollar.

In embodiments, the fixed ratio is one stable value digital asset token for 1 U.S. dollar.

In embodiments, the fixed ratio is 100 stable value digital asset tokens for one U.S. dollar.

In embodiments, the fiat currency is GB pound.

In embodiments, the fiat currency is SG dollar.

In embodiments, the fiat currency is EUR.

In embodiments, the fiat currency is HK dollar.

In embodiments, the fiat currency is Canadian dollar.

In embodiments, the fiat currency is Australian dollar.

In embodiments, the fiat currency is Yen.

In embodiments, the fourth sum of the currency is deposited in one or more bank accounts associated with the administrator.

In embodiments, the method further includes the steps of: (l) providing, by the administrator system a ledger including first account information associated with at least the first requesting user and second account information associated with at least the second requesting user, wherein the first account information includes first stable value digital asset token balance information and the second account information includes second stable value digital asset token balance information; (m) determining, by the administrator system, a total balance of the stable value digital asset tokens based on the sum of the first stable value digital asset token balance information and the second stable value digital asset token balance information; and (n) publishing, by the administrator system, the total balance of stable value digital asset tokens.

In embodiments, the currency is a cryptocurrency.

In embodiments, the cryptocurrency is Bitcoin.

In embodiments, the cryptocurrency is Litecoin.

In embodiments, the cryptocurrency is Bitcoin Cash.

In embodiments, the cryptocurrency is Filecoin.

In embodiments, the cryptocurrency is Zcash.

In embodiments, the cryptocurrency is Stellar.

In embodiments, the cryptocurrency is Polkadot.

In embodiments, the cryptocurrency is Atom.

In embodiments, the cryptocurrency is Tezos.

In embodiments, the first blockchain is an Ethereum blockchain.

In embodiments, the first blockchain is a Neo blockchain.

In embodiments, the first designated public key is mathematically associated with the first designated private key.

In embodiments, the second designated public key is mathematically associated with the second designated private key.

In embodiments, the first contract instructions are based on the ERC720 standard.

In embodiments, the first request to obtain the first sum of stable value digital asset tokens specifies a requester fee payable to the administrator system in addition to the second sum of the second digital asset and step (e) includes confirming, by the administrator system, receipt of the second sum of the second digital asset and the requester fee.

In embodiments, the first request to obtain the first sum of stable value digital asset tokens specifies a miner fee payable to miners associated with the first plurality of geographically distributed computer systems and step (e) includes confirming, by the administrator system, receipt of the second sum of the second digital asset and the miner fee.

In embodiments, a method of obtaining stable value digital asset tokens may comprise the steps of: (a) providing a first designated key pair comprising a first designated public key and a corresponding first designated private key, wherein the first designated private key also corresponds to a first designated public address associated with an underlying digital asset, wherein the underlying digital asset is maintained on a distributed public transaction ledger by a first plurality of geographically distributed computer systems in a first peer-to-peer network in the form of a first blockchain, and wherein the first designated private key is stored on a first computer system which is connected via the Internet to the first peer-to-peer network, (b) providing a second designated key pair comprising a second designated public key and a corresponding second designated private key, wherein the second designated private key also corresponds to a second designated public address associated with the underlying digital asset, and wherein the second designated private key is stored on a second computer system which is physically separated from the first computer system and is not operatively or physically connected to the first peer-to-peer network; (c) providing first smart contract instructions for a stable value digital asset token associated with a first contract address associated with the underlying digital asset, wherein the smart contract instructions are saved as part of the first blockchain for the underlying digital asset and include: (1) token creation instructions including instructions to create tokens; (2) token transfer instructions including instructions to transfer tokens; (3) token destruction instructions including instructions to destroy tokens; (4) authorization instructions associated with the first designated key pair; and (5) authorization instructions associated with the second designated key pair; (d) receiving, by a digital asset exchange system, a request to obtain a first sum of stable value digital asset tokens in exchange for a second sum of currency, wherein the first sum corresponds to the second sum based on a fixed ratio of the stable value digital asset token to the currency, wherein the request comes from a first requesting user with an associated first requester key pair, comprising a first requester public key and a corresponding first requester private key, and wherein the first requester private key also corresponds to a first requester public address associated with the underlying digital asset; (e) confirming, by the digital asset exchange system, receipt of the second sum of currency; (f) transferring the first sum of stable value digital asset tokens to the first requester public address using the following steps: (1) sending a second request, from the digital asset exchange system to the first computer system, to obtain the first sum of stable value digital asset tokens and transfer said first sum to the first requester public address; (2) generating, by the first computer system, first instructions addressed from the first designated public address to the first contract address including a message to obtain the first sum of stable value digital asset tokens and to assign the obtained first sum to the first requester public address; (3) digitally signing, by the first computer system, the first instructions using the first designated private key to generate first digitally signed instructions; and (4) sending, from the first computer system to the first plurality of geographically distributed computer systems, the first digitally signed instructions, wherein the first digitally signed instructions are executed by the first plurality of geographically distributed computer systems in accordance with the first contract instructions; and (g) confirming, by the digital asset exchange system, that the first sum of stable value digital asset tokens has been obtained and transferred to the first requester public address based on reference to the first blockchain.

In embodiments, the method further comprises the steps of: (h) receiving, by the digital asset exchange system, a third request to obtain a third sum of stable value digital asset tokens in exchange for a fourth sum of the currency, wherein the third sum corresponds to the fourth sum based on the fixed ratio of the stable value digital asset token to the currency, wherein the third request comes from a second requesting user with an associated second requester key pair, comprising a second requester public key and a corresponding second requester private key, and wherein the second requester private key is associated with a second requester public address associated with the underlying digital asset;

(i) confirming, by the digital asset exchange system, receipt of the fourth sum of the second digital asset; (j) transferring the third sum of stable value digital asset tokens to the second requester public address using the following steps: (1) generating, by the digital asset exchange system, second instructions from the second designated public address to the first contract address to obtain the third sum of stable value digital asset tokens and transfer said third sum to the second requester public address; (2) transferring, from the digital asset exchange system to a first portable memory device, the second instructions; (3) transferring, from the first portable memory device to the second computer, the second instructions; (4) digitally signing, by the second computer, the second instructions using the second designated private key to generate second digitally signed instructions; (5) transferring, from the second computer to a second portable memory device, the second digitally signed instructions; and (6) sending, from the second portable memory device to the first plurality of geographically distributed computer systems, the second digitally signed instructions; and (k) confirming, by the digital asset exchange system, that the third sum of stable value digital asset tokens have been obtained and transferred to the second requester public address based on reference to the first blockchain.

In embodiments, the step of (j)(6) includes steps of: (i) transferring, from the second portable memory device to the digital asset exchange system, the second digitally signed instructions; and (ii) transferring, from the digital asset exchange system to the plurality of geographically distributed computer systems, the second digitally signed instructions.

In embodiments, the method further comprises the steps of: (l) providing a third designated key pair comprising a third designated public key and a corresponding third designated private key, wherein the third designated private key is stored on a third computer system which is physically separated from the first computer system and the second computer system and wherein the third computer system is not operatively connected or physically connected to the peer-to-peer network; wherein the first smart contract instructions further include: (6) authorization instructions associated with the third designated key pair; and wherein, with respect to step (j), performing the following further steps: (7) determining that the first designated key pair does not have authority to obtain the third sum of stable value digital asset tokens; (8) determining, by the digital asset exchange system, the third designated key pair and the second designated key pair together have authority to obtain the third sum; (9) generating, by the digital asset exchange system, third instructions from the third designated public address to the first contract address to obtain the third sum of stable value digital asset tokens and transfer said third sum to the second requester public address; (10) transferring, from the digital asset exchange system to a third portable memory device, the third instructions; (11) transferring, from the third portable memory device to the third computer system, the third instructions; (12) digitally signing, by the third computer system, the third instructions using the third designated private key to generate third digitally signed instructions: (13) transferring, from the third computer system to a fourth portable memory device, the third digitally signed instructions; and (14) sending, from the fourth portable memory device to the first plurality of geographically distributed computer systems, the third digitally signed instructions.

In embodiments, step (j)(14) includes the steps of: (A) transferring, from the fourth portable memory device to the digital asset exchange system, the third digitally signed instructions; and (B) transferring, from the digital asset exchange system to the plurality of geographically distributed computer systems, the third digitally signed instructions.

In embodiments, the third portable memory device and fourth portable memory device are the same portable memory device.

In embodiments, the third portable memory device and fourth portable memory device are different portable memory devices.

In embodiments, the first portable memory device and second portable memory device are the same portable memory device.

In embodiments, the first portable memory device and second portable memory device are different portable memory devices.

In embodiments, the method further includes the steps of: (l) providing a third designated key pair comprising a third designated public key and a corresponding third designated private key, wherein the third designated private key is stored on a third computer system which is physically separated from the first computer system and the second computer system and wherein the third computer system is not operatively connected or physically connected to the first peer-to-peer network; and wherein the first smart contract instructions further include: (6) authorization instructions associated with the third key pair; and wherein with respect to step (j), performing the following further steps: (7) determining the first designated key pair does not have authority to obtain the third sum; (8) determining the first designated key pair does not have authority to obtain the third sum; (9) determining, by the digital asset exchange system, that the third designated key pair, the second designated key pair and the first designated key pair together have authority to obtain the third sum; (10) sending a fifth request, from the digital asset exchange system to the first computer system, to obtain the third sum of stable value digital asset tokens and transfer said third sum to the second requester public address; (11) generating, by the digital asset exchange system, third instructions from the third designated public address to the first contract address to obtain the third sum of stable value digital asset tokens and transfer said third sum to the second requester public address; (12) transferring, from the digital asset exchange system to a third portable memory device, the third instructions; (13) transferring, from the third portable memory device to the third computer system, the third instructions; (14) digitally signing, by the third computer system, the third instructions using the third designated private key to generate third digitally signed instructions; (15) transferring, from the third computer system to a fourth portable memory device, the third digitally signed instructions; and (16) sending, from the fourth portable memory device to the first plurality of geographically distributed computer systems, the third digitally signed instructions.

In embodiments, the step (j)(16) includes the steps of: (A) transferring, from the fourth portable memory device to the digital asset exchange system, the third digitally signed instructions; and (B) transferring, from the digital asset exchange system to the plurality of geographically distributed computer systems, the third digitally signed instructions.

In embodiments, the fourth sum of the stable vale digital asset token is used by the digital asset exchange to purchase one or more interest bearing financial instruments.

In embodiments, the method further includes the steps of: (l) generating, by a first requester computing device associated with the first requester, a transfer message to transfer stable value digital asset tokens to the second requester public address, the transfer message including: (1) a transfer number of stable value digital asset tokens; (2) the first requester public address; (3) the second requester public address; and (4) an electronic signature based on the first requester private key; (m) publishing, by the first requester computing device to the to the first plurality of geographically distributed computer systems, the transfer message; and (n) confirming, by the first requester computing device, the transfer of the transfer number of stable value digital asset tokens from the first requester public address to the second requester public address by reference to the first blockchain.

In embodiments, the authorization instructions associated with the first designated key pair include a limit on a number of tokens the first designated key pair is authorized to issue.

In embodiments, the authorization instructions associated with the first designated key pair include a time limit during which the first designated key pair is authorized to issue tokens.

In embodiments, the authorization instructions associated with the first designated key pair include a limit on a number of tokens the first designated key pair is authorized to issue over a period of time.

In embodiments, the currency is fiat currency.

In embodiments, the fiat currency is U.S. Dollar.

In embodiments, the fixed ratio is one stable value digital asset token for 1 U.S. dollar.

In embodiments, the fixed ratio is 100 stable value digital asset tokens for one U.S. dollar.

In embodiments, the fiat currency is GB pound.

In embodiments, the fiat currency is SG dollar.

In embodiments, the fiat currency is EUR.

In embodiments, the fiat currency is HK dollar.

In embodiments, the fiat currency is Canadian dollar.

In embodiments, the fiat currency is Australian dollar.

In embodiments, the fiat currency is Yen.

In embodiments, the fourth sum of the currency is deposited in one or more bank accounts associated with the digital asset exchange.

In embodiments, the method further includes the steps of: (l) providing, by the digital asset exchange system a ledger including first account information associated with at least the first requesting user and second account information associated with at least the second requesting user, wherein the first account information includes first stable value digital asset token balance information and the second account information includes second stable value digital asset token balance information; (m) determining, by the digital asset exchange system, a total balance of the stable value digital asset tokens based on the sum of the first stable value digital asset token balance information and the second stable value digital asset token balance information; and (n) publishing, by the digital asset exchange system, the total balance of stable value digital asset tokens.

In embodiments, the currency is a cryptocurrency.

In embodiments, the cryptocurrency is Bitcoin.

In embodiments, the cryptocurrency is Litecoin.

In embodiments, the cryptocurrency is Bitcoin Cash.

In embodiments, the cryptocurrency is Filecoin.

In embodiments, the cryptocurrency is Zcash.

In embodiments, the cryptocurrency is Stellar.

In embodiments, the cryptocurrency is Polkadot.

In embodiments, the cryptocurrency is Atom.

In embodiments, the cryptocurrency is Tezos.

In embodiments, the first blockchain is an Ethereum blockchain.

In embodiments, the first blockchain is a Neo blockchain.

In embodiments, the first designated public key is mathematically associated with the first designated private key.

In embodiments, the second designated public key is mathematically associated with the second designated private key.

In embodiments, the first contract instructions are based on the ERC720 standard.

In embodiments, the first request to obtain the first sum of stable value digital asset tokens specifies a requester fee payable to the digital asset exchange system in addition to the second sum of the second digital asset and step (e) includes confirming, by the digital asset exchange system, receipt of the second sum of the second digital asset and the requester fee.

In embodiments, the first request to obtain the first sum of stable value digital asset tokens specifies a miner fee payable to miners associated with the first plurality of geographically distributed computer systems and step (e) includes confirming, by the digital asset exchange system, receipt of the second sum of the second digital asset and the miner fee.

In embodiments, a method of obtaining stable value digital asset tokens may comprise the steps of: (a) providing a first designated key pair comprising a first designated public key and a corresponding first designated private key, wherein the first designated private key also corresponds to a first designated public address associated with an underlying digital asset, wherein the underlying digital asset is maintained on a distributed public transaction ledger by a first plurality of geographically distributed computer systems in a first peer-to-peer network in the form of a first blockchain, and wherein the first designated private key is stored on a first computer system which is connected via the Internet to the first peer-to-peer network; (b) providing a second designated key pair comprising a second designated public key and a corresponding second designated private key, wherein the second designated private key also corresponds to a second designated public address associated with the underlying digital asset, and wherein the second designated private key is stored on a second computer system which is physically separated from the first computer system and is not operatively or physically connected to the first peer-to-peer network; (c) providing first smart contract instructions for a stable value digital asset token associated with a first contract address associated with the underlying digital asset, wherein the smart contract instructions are saved as part of the first blockchain for the underlying digital asset and include: (1) token creation instructions including instructions to create tokens; (2) token transfer instructions including instructions to transfer tokens; (3) token destruction instructions including instructions to destroy tokens; (4) authorization instructions associated with the first designated key pair; and (5) authorization instructions associated with the second designated key pair; (d) receiving, by a digital asset token issuer system, a request to obtain a first sum of stable value digital asset tokens in exchange for a second sum of currency, wherein the first sum corresponds to the second sum based on a fixed ratio of the stable value digital asset token to the currency, wherein the request comes from a first requesting user with an associated first requester key pair, comprising a first requester public key and a corresponding first requester private key, and wherein the first requester private key also corresponds to a first requester public address associated with the underlying digital asset; (e) confirming, by the digital asset token issuer system, receipt of the second sum of currency; (f) transferring the first sum of stable value digital asset tokens to the first requester public address using the following steps: (1) sending a second request, from the digital asset token issuer system to the first computer system, to obtain the first sum of stable value digital asset tokens and transfer said first sum to the first requester public address; (2) generating, by the first computer system, first instructions addressed from the first designated public address to the first contract address including a message to obtain the first sum of stable value digital asset tokens and to assign the obtained first sum to the first requester public address; (3) digitally signing, by the first computer system, the first instructions using the first designated private key to generate first digitally signed instructions; and (4) sending, from the first computer system to the first plurality of geographically distributed computer systems, the first digitally signed instructions, wherein the first digitally signed instructions are executed by the first plurality of geographically distributed computer systems in accordance with the first contract instructions; and (g) confirming, by the digital asset token issuer system, that the first sum of stable value digital asset tokens has been obtained and transferred to the first requester public address based on reference to the first blockchain.

In embodiments, the method further comprises the steps of: (h) receiving, by the digital asset token issuer system, a third request to obtain a third sum of stable value digital asset tokens in exchange for a fourth sum of the currency, wherein the third sum corresponds to the fourth sum based on the fixed ratio of the stable value digital asset token to the currency, wherein the third request comes from a second requesting user with an associated second requester key pair, comprising a second requester public key and a corresponding second requester private key, and wherein the second requester private key is associated with a second requester public address associated with the underlying digital asset; (i) confirming, by the digital asset token issuer system, receipt of the fourth sum of the second digital asset; (j) transferring the third sum of stable value digital asset tokens to the second requester public address using the following steps: (1) generating, by the digital asset token issuer system, second instructions from the second designated public address to the first contract address to obtain the third sum of stable value digital asset tokens and transfer said third sum to the second requester public address; (2) transferring, from the digital asset token issuer system to a first portable memory device, the second instructions; (3) transferring, from the first portable memory device to the second computer, the second instructions; (4) digitally signing, by the second computer, the second instructions using the second designated private key to generate second digitally signed instructions; (5) transferring, from the second computer to a second portable memory device, the second digitally signed instructions; and (6) sending, from the second portable memory device to the first plurality of geographically distributed computer systems, the second digitally signed instructions; and (k) confirming, by the digital asset token issuer system, that the third sum of stable value digital asset tokens have been obtained and transferred to the second requester public address based on reference to the first blockchain.

In embodiments, the step of (j)(6) includes steps of: (i) transferring, from the second portable memory device to the digital asset token issuer system, the second digitally signed instructions; and (ii) transferring, from the digital asset token issuer system to the plurality of geographically distributed computer systems, the second digitally signed instructions.

In embodiments, the method further comprises the steps of: (l) providing a third designated key pair comprising a third designated public key and a corresponding third designated private key, wherein the third designated private key is stored on a third computer system which is physically separated from the first computer system and the second computer system and wherein the third computer system is not operatively connected or physically connected to the peer-to-peer network; wherein the first smart contract instructions further include: (6) authorization instructions associated with the third designated key pair; and wherein, with respect to step (j), performing the following further steps: (7) determining that the first designated key pair does not have authority to obtain the third sum of stable value digital asset tokens; (8) determining, by the digital asset token issuer system, the third designated key pair and the second designated key pair together have authority to obtain the third sum; (9) generating, by the digital asset token issuer system, third instructions from the third designated public address to the first contract address to obtain the third sum of stable value digital asset tokens and transfer said third sum to the second requester public address; (10) transferring, from the digital asset token issuer system to a third portable memory device, the third instructions; (11) transferring, from the third portable memory device to the third computer system, the third instructions; (12) digitally signing, by the third computer system, the third instructions using the third designated private key to generate third digitally signed instructions; (13) transferring, from the third computer system to a fourth portable memory device, the third digitally signed instructions; and (14) sending, from the fourth portable memory device to the first plurality of geographically distributed computer systems, the third digitally signed instructions.

In embodiments, step (j)(14) includes the steps of: (A) transferring, from the fourth portable memory device to the digital asset token issuer system, the third digitally signed instructions; and (B) transferring, from the digital asset token issuer system to the plurality of geographically distributed computer systems, the third digitally signed instructions.

In embodiments, the third portable memory device and fourth portable memory device are the same portable memory device.

In embodiments, the third portable memory device and fourth portable memory device are different portable memory devices.

In embodiments, the first portable memory device and second portable memory device are the same portable memory device.

In embodiments, the first portable memory device and second portable memory device are different portable memory devices.

In embodiments, the method further includes the steps of: (l) providing a third designated key pair comprising a third designated public key and a corresponding third designated private key, wherein the third designated private key is stored on a third computer system which is physically separated from the first computer system and the second computer system and wherein the third computer system is not operatively connected or physically connected to the first peer-to-peer network; and wherein the first smart contract instructions further include: (6) authorization instructions associated with the third key pair; and wherein with respect to step (j), performing the following further steps: (7) determining the first designated key pair does not have authority to obtain the third sum; (8) determining the first designated key pair does not have authority to obtain the third sum; (9) determining, by the digital asset token issuer system, that the third designated key pair, the second designated key pair and the first designated key pair together have authority to obtain the third sum; (10) sending a fifth request, from the digital asset token issuer system to the first computer system, to obtain the third sum of stable value digital asset tokens and transfer said third sum to the second requester public address; (11) generating, by the digital asset token issuer system, third instructions from the third designated public address to the first contract address to obtain the third sum of stable value digital asset tokens and transfer said third sum to the second requester public address; (12) transferring, from the digital asset token issuer system to a third portable memory device, the third instructions; (13) transferring, from the third portable memory device to the third computer system, the third instructions; (14) digitally signing, by the third computer system, the third instructions using the third designated private key to generate third digitally signed instructions; (15) transferring, from the third computer system to a fourth portable memory device, the third digitally signed instructions; and (16) sending, from the fourth portable memory device to the first plurality of geographically distributed computer systems, the third digitally signed instructions.

In embodiments, the step (j)(16) includes the steps of: (A) transferring, from the fourth portable memory device to the digital asset token issuer system, the third digitally signed instructions; and (B) transferring, from the digital asset token issuer system to the plurality of geographically distributed computer systems, the third digitally signed instructions.

In embodiments, the fourth sum of the stable vale digital asset token is used by the digital asset token issuer to purchase one or more interest bearing financial instruments.

In embodiments, the method further includes the steps of: (l) generating, by a first requester computing device associated with the first requester, a transfer message to transfer stable value digital asset tokens to the second requester public address, the transfer message including: (1) a transfer number of stable value digital asset tokens; (2) the first requester public address; (3) the second requester public address; and (4) an electronic signature based on the first requester private key; (m) publishing, by the first requester computing device to the to the first plurality of geographically distributed computer systems, the transfer message; and (n) confirming, by the first requester computing device, the transfer of the transfer number of stable value digital asset tokens from the first requester public address to the second requester public address by reference to the first blockchain.

In embodiments, the authorization instructions associated with the first designated key pair include a limit on a number of tokens the first designated key pair is authorized to issue.

In embodiments, the authorization instructions associated with the first designated key pair include a time limit during which the first designated key pair is authorized to issue tokens.

In embodiments, the authorization instructions associated with the first designated key pair include a limit on a number of tokens the first designated key pair is authorized to issue over a period of time.

In embodiments, the currency is fiat currency.

In embodiments, the fiat currency is U.S. Dollar.

In embodiments, the fixed ratio is one stable value digital asset token for 1 U.S. dollar.

In embodiments, the fixed ratio is 100 stable value digital asset tokens for one U.S. dollar.

In embodiments, the fiat currency is GB pound.

In embodiments, the fiat currency is SG dollar.

In embodiments, the fiat currency is EUR.

In embodiments, the fiat currency is HK dollar.

In embodiments, the fiat currency is Canadian dollar.

In embodiments, the fiat currency is Australian dollar.

In embodiments, the fiat currency is Yen.

In embodiments, the fourth sum of the currency is deposited in one or more bank accounts associated with the digital asset token issuer.

In embodiments, the method further includes the steps of: (l) providing, by the digital asset token issuer system a ledger including first account information associated with at least the first requesting user and second account information associated with at least the second requesting user, wherein the first account information includes first stable value digital asset token balance information and the second account information includes second stable value digital asset token balance information; (m) determining, by the digital asset token issuer system, a total balance of the stable value digital asset tokens based on the sum of the first stable value digital asset token balance information and the second stable value digital asset token balance information; and (n) publishing, by the digital asset token issuer system, the total balance of stable value digital asset tokens.

In embodiments, the currency is a cryptocurrency.

In embodiments, the cryptocurrency is Bitcoin.

In embodiments, the cryptocurrency is Litecoin.

In embodiments, the cryptocurrency is Bitcoin Cash.

In embodiments, the cryptocurrency is Filecoin.

In embodiments, the cryptocurrency is Zcash.

In embodiments, the cryptocurrency is Stellar.

In embodiments, the cryptocurrency is Polkadot.

In embodiments, the cryptocurrency is Atom.

In embodiments, the cryptocurrency is Tezos.

In embodiments, the first blockchain is an Ethereum blockchain.

In embodiments, the first blockchain is a Neo blockchain.

In embodiments, the first designated public key is mathematically associated with the first designated private key.

In embodiments, the second designated public key is mathematically associated with the second designated private key.

In embodiments, the first contract instructions are based on the ERC720 standard.

In embodiments, the first request to obtain the first sum of stable value digital asset tokens specifies a requester fee payable to the digital asset token issuer system in addition to the second sum of the second digital asset and step (e) includes confirming, by the digital asset token issuer system, receipt of the second sum of the second digital asset and the requester fee.

In embodiments, the first request to obtain the first sum of stable value digital asset tokens specifies a miner fee payable to miners associated with the first plurality of geographically distributed computer systems and step (e) includes confirming, by the digital asset token issuer system, receipt of the second sum of the second digital asset and the miner fee.

Blockchain Based Dividend Using Stable Value Coin

Figure 11D:
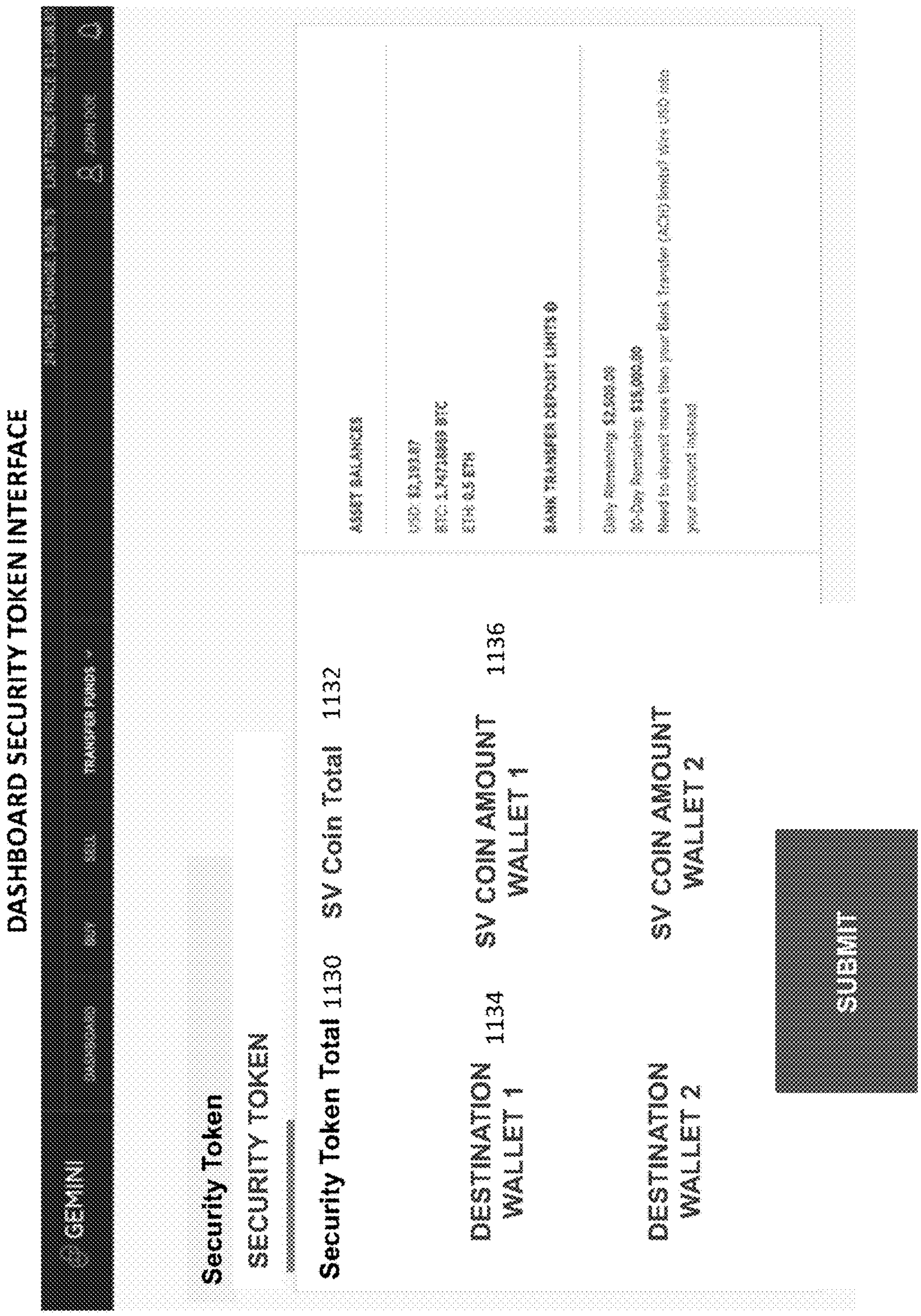
FIG. 11D illustrates an exemplary dashboard Security Token interface which allow Security Token issuers to provide instructions to transfer SVCoins to Security Token holders in accordance with exemplary embodiments of the present invention.

FIG. 11D illustrates an exemplary embodiment of a dashboard Security Token interface which allow Security Token issuers to provide instructions to transfer SVCoins to Security Token holders.

Figure 12:
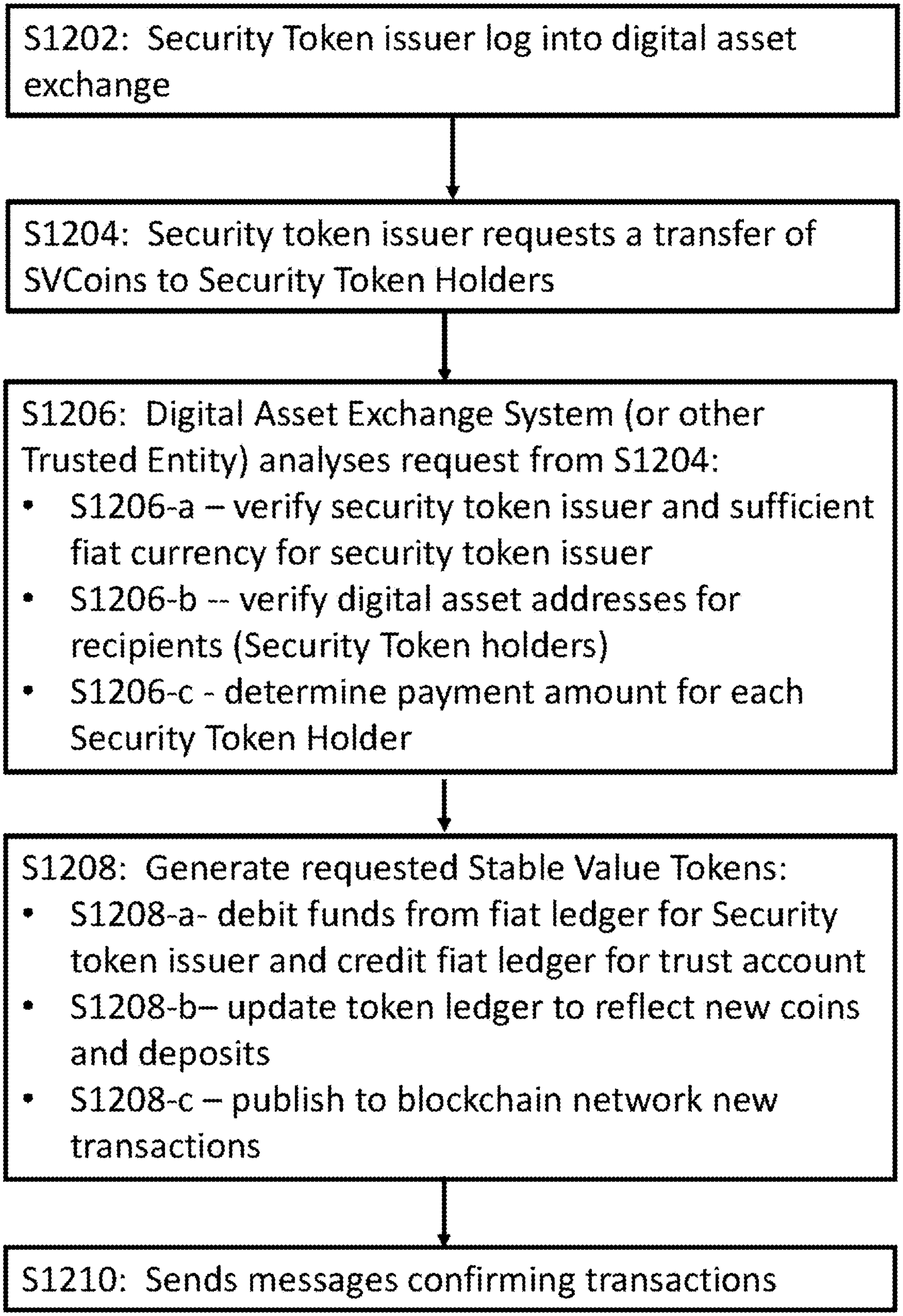
FIG. 12 illustrates an exemplary flow chart reflecting an exemplary embodiment where a Security Token issuer initiates a transfer of SVCoins to Security Token holders in accordance with exemplary embodiments of the present invention.

Referring to FIG. 12, an exemplary process flow reflecting an exemplary embodiment is shown where a Security Token issuer initiates a transfer of SVCoins to Security Token holders. It will be appreciated by those skilled in the art that the order of this process may be modified consistent with embodiments of the present invention.

In Step S1202, the Security Token issuer (who will generally by a registered user with the digital asset exchange) will log into the digital asset exchange. In embodiments, one or more Security Toekn Issuer log ins may be similar to one or more of the authentication process(es) of user(s) and/or customer(s) described throughout this application, the descriptions of each applying herein. In embodiments, the digital asset exchange (e.g., the SVCoin issuer) may be a trusted entity, including a digital asset exchange, bank, trust or other trusted entity. In embodiments, the Security Token issuer will be an authorized user, or otherwise qualified with respect to the trusted entity. In embodiments, the trusted entity may act as agent of the Security Token issuer to generate, distribute and maintain a ledger of SVCoins on behalf of the Security Token issuer.

In Step S1204, the Security Token issuer system, or any trusted entity system acting as agent, will navigate to the dashboard Security Token interface (see, e.g., FIG. 11D) to initiate a request for transfer of SVCoins to Security Token holders. While for purposes of illustration, the request is made via the dashboard Security Token interface, those of skill in the art will appreciate that the request may be made via API calls, submitted by electronic mail, and/or other electronic interactions, consistent with embodiments of the invention. The request, in embodiments may be sent via a secure channel, such as an encrypted communication. For example, the request may be encrypted using an asymmetric key, such as a PKI key, and/or using a symmetric key, such as used in TLS, to name a few. The request, in embodiments, may be encrypted by the sender (e.g., the security token issuer) and/or the recipient (e.g., the digital asset exchange system), to name a few. In embodiments, the request shall identify: (i) the Security Token 1130; (ii) the total amount of SVCoins to be distributed 1132; (iii) the Security Token holder's digital asset addresses 1134; (iii) the amount of SVCoins to be distributed to each digital asset address 1136; and/or (iv) other information sufficient to calculate or otherwise determine this information. In embodiments, this information may be provided by providing the digital asset exchange, or other trusted entity system acting on behalf of the SVCoin issuer, with the access to the Security Token database, which would include the list of all current Security Token holders and their respective digital asset address and Security Token balances. In embodiments, the Security Token database may include a list of all current Security Token holders and digital asset addresses associated with each. In such embodiments, the Security Token issuer, may still need to provide the digital asset exchange system, or other trusted entity system, with the amount of SVCoins to be distributed, either individually and/or in total and how to prorate the distribution among Security Token holders.

In Step S1206, the digital asset exchange system, or other trusted entity system, may analyze and verify that the request can be properly processed. In step S1206-*a*, the digital asset exchange system, as the SVCoin issuer or on behalf of the SVCoin issuer, may verify that the security token issuer has sufficient fiat maintained at the digital asset exchange to cover the transaction, including a sufficient amount of fiat to cover the amount of SVCoin being acquired, as well as any transaction fees that may be charged. If the user does not have sufficient fiat in the system, the transaction may be terminated for insufficient funds. In embodiments, the security token issuer system may be provided an opportunity to obtain sufficient funds, by, e.g., selling digital assets maintained by the security token issuer system on the digital asset exchange or by making a deposit of additional fiat. In step S1206-*b*, the digital asset exchange system, may also verify that the digital asset addresses provided are each a valid digital asset addresses. To the extent any digital asset addresses are not verified, the transaction may be rejected, and/or the digital asset exchange system may enter into a reconciliation process with the Security Token issuer system or trusted entity system.

At step 1206-*c*, the digital asset exchange system, or other trusted entity system, may determine an amount of SVCoins to be distributed to each of the digital addresses of the Security Token holders. In embodiments, this determination may be made based on the total number of Security Token holders and the total amount of SVCoins requested by the Security Token issuer. In embodiments, the Security Token issuer may designate a specific sum of SVCoins per Security token. In embodiments, a total amount of SVCoins to be purchased may be designated in the request of the Security Token issue with directions to equally or proportionally divide the total sum between the Security Token holders. In embodiments, the SVCoins may be pegged to currency. For example, the SVCoins may be pegged to fiat (e.g., U.S. Dollar). As another example, the SVCoins may be pegged to cryptocurrency (e.g., a math-based digital asset). In embodiments, the SVCoins may be pegged to a basket of currency which may include one or more type of fiat and/or digital assets, to name a few.

In S1208, after the digital asset exchange system, or other trusted entity system, has confirmed that the user has sufficient fiat to cover the transaction, the digital asset exchange system may initiate the process of generating the requested SVCoin.

In S1208-*a*, the digital asset exchange system, or other trusted entity system, may debit the designated fiat funds from a fiat ledger associated with the Security Token issuer user account, and credit a corresponding amount of fiat to the SVCoin fiat ledger to be held in trust by the exchange. In embodiments, this fiat is held in a custodial account of the exchange or an agent of the exchange. In embodiments step S1208-*a* may occur after a transaction request associated with the generation of SVCoins is published, verified, executed, and/or confirmed to be executed In S1208-*b*, the digital asset exchange system, or other trusted entity system, shall generate instructions to generate the requested SVCoin tokens, including instructions to update the SVCoin token ledger database to reflect the addition of the new tokens and the corresponding digital asset addresses associated with such new SVCoin tokens.

In S1208-*c*, the digital asset exchange system, or other trusted entity system, shall publish to the blockchain network (e.g., the ETHEREUM Network) the transaction with instructions to be recorded by the blockchain network. In embodiments, a transaction fee may be required by, e.g., a miner, to process and add the requested transaction on the blockchain.

In embodiments, where SVCoin tokens have already been created and are maintained by the digital asset exchange system on reserve, S1208 may be replaced with S1208' as follows (not shown). In step S1208-*a*', the digital asset exchange system, or other trusted entity system, may debit the designated fiat funds from a fiat ledger associated with the Security Token issuer user account, and credit a corresponding amount of fiat to the SVCoin fiat ledger to be held in trust by the exchange, or otherwise reserved by the trusted entity.

At step S1208-*b*', the digital asset exchange computer system, or other trusted entity system may then determine a portion of the reserve for transfer based on the requested amount of SVCoin identified by the Security Token issuer for transfer to the Security Token holder(s).

At step 1208-*c*', the digital asset exchange computer system, or other trusted entity system may update the SVCoin token ledger to change the address associated with the determined portion of the reserve SVCoin tokens to the address, or addresses, associated with the Security Token holder.

In embodiments, where SVCoin tokens are pegged to cryptocurrency (e.g., a first digital asset), referring to FIG. 12A, steps S1206 and S1208 may be replaced by steps S1206" and S1208". At step S1206", in embodiments, the digital asset exchange system, or other trusted entity system, may analyze and verify that the request can be properly processed. In step S1206"-*a*, the digital asset exchange system, as the SVCoin issuer or on behalf of the SVCoin issuer, may verify that the security token issuer has sufficient second digital asset maintained at the digital asset exchange to cover the transaction, including a sufficient amount of second digital asset to cover the amount of SVCoin being acquired, as well as any transaction fees that may be charged. If the security token issuer does not have sufficient second digital asset in the system, the transaction may be terminated for insufficient funds. In embodiments, the security token issuer may be provided an opportunity to obtain sufficient funds, by, e.g., selling digital assets maintained by the security token issuer system on the digital asset exchange or by making a deposit of additional second digital asset. In step S1206"-*b*, the digital asset exchange system, may also verify that the digital asset addresses associated with the security token holders (e.g., the digital asset addresses provided by the security token issuer) are valid digital asset addresses on the blockchain. If the security token issuer has not provided valid digital asset addresses, the transaction may be terminated. In embodiments, communications described in connection with FIGS. 12 and 12A (e.g., a notification of insufficient funds and/or a notification of an opportunity to obtain sufficient funds) may be sent via a secure channel, such as an encrypted communication. For example, communications may be encrypted using an asymmetric key, such as a PKI key, and/or using a symmetric key, such as used in TLS, to name a few. Communications, in embodiments, may be encrypted by the sender (e.g., the digital asset exchange system) and/or the recipient (e.g., the security token issuer and/or security token holders), to name a few. In embodiments, the second digital asset may be maintained on a blockchain that is different from the blockchain which maintains the SVCoin.

To the extent any digital asset addresses are not verified, the transaction may be rejected, and/or the digital asset exchange system may enter into a reconciliation process with the Security Token issuer system or trusted entity system. In embodiments, verification of the received request may include, for example, one or more exchange format requirements associated with issuing SVCoins to one or more security token holders. For example, a valid request may require the security token issuer to provide a digital asset address for each of the identified security token holders.

At step 1206"-*c*, the digital asset exchange system, or other trusted entity system, may determine an amount of SVCoins to be distributed to each of the digital addresses of the Security Token holders. In embodiments, this determination may be made based on the total number of Security Token holders and the total amount of SVCoins requested by the Security Token issuer. In embodiments, the Security Token issuer may designate a specific sum of SVCoins per Security token. In embodiments, a total amount of SVCoins to be purchased may be designated in the request of the Security Token issue with directions to equally or proportionally divide the total sum between the Security Token holders. In embodiments, the SVCoins may be pegged to currency. For example, the SVCoins may be pegged to fiat (e.g., U.S. Dollar). As another example, the SVCoins may be pegged to cryptocurrency (e.g., a math-based digital asset). In embodiments, the SVCoins may be pegged to a basket of currency which may include one or more type of fiat and/or digital assets, to name a few.

In embodiments, the process may continue with step S1208". At step S1208", after the digital asset exchange system, or other trusted entity system, has confirmed that the user has sufficient second digital asset to cover the transaction, the digital asset exchange system may initiate the process of generating the requested SVCoin.

In S1208"-*a*, the digital asset exchange system, or other trusted entity system, may debit the designated second digit asset funds from a digital asset ledger associated with the Security Token issuer user account, and credit a corresponding amount of second digital asset to the SVCoin digital asset ledger to be held in trust by the exchange. In embodiments, the designated second digital asset is held in a custodial account of the exchange or an agent of the exchange. In embodiments step S1208"-*a* may occur after a transaction request associated with the generation of SVCoins is published, verified, executed, and/or confirmed to be executed.

At step S1208"-*b*, the digital asset exchange system, or other trusted entity system, may generate instructions to generate the requested SVCoin. In embodiments, the digital asset exchange system, or other trusted entity system, may generate a transaction request, including the instructions to generate the requested SVCoins. The transaction request, in embodiments, may be digitally signed by the digital asset exchange system (e.g., using a private key associated with the digital asset exchange system system) and/or digitally signed by the digital asset exchange system, one or more security token holders, and/or the security token issuer system (e.g., via MPC). In embodiments, the digital asset exchange system may generate instructions to update the SVCoin token ledger database to reflect the addition of the new tokens and the corresponding digital asset addresses associated with such new SVCoin tokens. In embodiments, the token ledger database may be updated after the transaction request is published and/or confirmed to be executed.

At step S1208"-*c*, the digital asset exchange system, or other trusted entity system, may publish to the blockchain network (e.g., the ETHEREUM Network) the transaction with instructions to be recorded by the blockchain network. In embodiments, a transaction fee may be required by, e.g., a miner, to process and add the requested transaction on the blockchain. The published transaction request, in embodiments, may be verified by one or more nodes on the blockchain and/or executed by one or more nodes on the blockchain. In embodiments, a transaction fee may be required by one or more nodes, e.g., a miner, to verify and/or execute the generated transaction request.

In S1210, the digital asset exchange computer system may send a message to the Security Token issuer registered user, and/or each of the designated digital asset addresses to reflect that the transaction was successfully processed. In embodiments, such messages may include information including: (i) digital asset address; (ii) the amount of tokens generated/or determined for transfer; and/or (iii) the new balances for the digital asset address or digital wallet associated therewith. In embodiments, the message may include additional information related to the Security Token, including: (iv) the amount of the Security Token held; (v) the dividend issued; and/or (vi) instructions on how to redeem the SVCoin.

In embodiments, a method of issuing electronic payments using a stable value digital asset token on a digital asset security token may comprise the steps of: (a) providing a digital asset security token database stored on a first set of one or more computer readable media associated with a digital asset security token issuer system associated with a digital asset security token issuer, wherein the digital asset security token database comprises a log of digital asset security tokens including: (i) a first set of digital asset addresses including a respective digital asset address for each respective digital asset security token holder; and (ii) a respective digital asset security token amount associated with each respective digital asset address, wherein each respective digital asset address of the first set of digital asset addresses is tied to a first distributed public transaction ledger maintained by a first plurality of geographically distributed computer systems in a first peer-to-peer network in the form of a first blockchain; (b) providing a stable value digital asset token database stored on the first distributed public transaction ledger maintained by the first plurality of geographically distributed computer systems in the first peer-to-peer network in the form of the first blockchain, wherein the stable value digital asset token database comprises a log of stable value digital asset tokens including: (i) a second set of digital asset addresses including a second respective digital asset address for each respective stable value digital asset token holder; (ii) a respective stable value digital asset token amount for each respective stable value digital asset token holder, wherein the stable value digital asset tokens are issued by a stable value Administrator using an Administrator computer system associated with a Administrator; (c) receiving, by the Administrator computer system, a first request from the digital asset security token issuer system to purchase a first sum of stable value digital asset tokens in exchange for a second sum of a second digital asset, wherein the first sum corresponds to the second sum based on a fixed notional amount, wherein the second digital asset is maintained on a second distributed public transaction ledger maintained by a second plurality of geographically distributed computer systems in a second peer-to-peer network in the form of a second blockchain; (d) verifying, by the Administrator computer system, the first request, including: (i) verifying, by the Administrator computer system, that the digital asset security token issuer is a registered user of the Administrator; and (ii) verifying, by the Administrator computer system, that the digital asset security token issuer has at least the second sum of the second digital asset available for transaction with the Administrator as reflected in a second digital asset electronic ledger of the Administrator computer system; (e) accessing, by the Administrator computer system, the digital asset security token database to determine: (i) each respective digital asset address of the first set of digital asset addresses on the first blockchain for each respective digital asset security token holder; and (ii) the respective digital asset security token amount associated with each respective digital asset address; (f) determining a respective payment amount in stable value digital asset tokens to be made to each respective digital asset address of the first set of digital asset addresses based at least in part on the fixed notional amount, the first sum of stable value digital asset tokens, and the respective digital asset security token amount associated with each respective digital asset address of the first set of digital asset addresses; (g) generating, by the Administrator computer system, transaction instructions for the first sum of stable value digital asset tokens by updating the stable value digital asset token database to reflect the addition of new stable value digital asset tokens in the amount of the first sum and the corresponding digital asset addresses associated with each new stable value digital asset token and a digital signature based on a private key associated with the Administrator; (h) transferring, by the Administrator computer system, the first sum of the stable value digital asset on a stable value digital asset electronic ledger from the user account of the digital asset security token issuer, to a custodial account of the Administrator associated with stable value digital asset tokens; (i) generating, by the Administrator computer system to the first blockchain, transaction instructions associated with crediting the respective payment amount of stable value digital asset tokens to each respective digital asset address of the first set of digital asset addresses; (j) publishing, by the Administrator computer system to the first blockchain, the transaction instructions associated with crediting the respective payment amount of stable value digital asset tokens to each respective digital asset address of the first set of digital asset addresses, where ownership of each digital asset security token associated with each respective digital asset security token amount remains the same; and (k) notifying, by the Administrator computer system, each digital asset address of the first set of the digital asset addresses of each respective transfer of stable value digital asset tokens to each respective digital asset address of the first set of digital asset addresses.

In embodiments, verifying the first request further includes: (iii) verifying, by the Administrator computer system, the second sum of the second digital asset is associated with a public address on the second blockchain associated with the digital asset security token issuer.

In embodiments, the first blockchain is an Ethereum network.

In embodiments, the second blockchain is a Bitcoin network.

In embodiments, the second blockchain is a Bitcoin Cash network.

In embodiments, the second blockchain is a Stellar network.

In embodiments, the second blockchain is a Filecoin network.

In embodiments, the second blockchain is a Litecoin network.

In embodiments, the second blockchain is a Tezos network.

In embodiments, the second blockchain is a Zcash network.

In embodiments, the first blockchain is a Neo Network.

In embodiments, the first blockchain is an Ether Classic network.

In embodiments, the Administrator is a regulated digital asset exchange.

In embodiments, the digital asset security token is a security registered with a government authority.

In embodiments, the digital asset security token is a debt security and the electronic payments are interest.

In embodiments, the digital asset security token is an equity security and the electronic payments are dividends.

In embodiments, the digital asset security token is secured by intellectual property rights and the electronic payments are royalties.

In embodiments, the second blockchain is based on a mathematical protocol for proof of work.

In embodiments, the second blockchain is based on a mathematical protocol for proof of stake.

In embodiments, the second blockchain is based on a cryptographic mathematical protocol.

In embodiments, the method may further comprise a step of publishing, by the Administrator computer system to a side ledger, the transaction instructions associated with crediting the respective payment amount of stable value digital asset tokens to each respective digital asset address of the first set of digital asset addresses and the publishing step (j) includes publishing the transaction instructions from the side ledger to the first distributed public asset ledger periodically or aperiodically.

In embodiments, the method may further comprise steps of: (l) receiving, at the digital asset security token issuer system, from at least one digital asset security token holder, a payment request prior to the receiving step (c), the payment request including: (i) a digital asset address of the at least one digital asset security token holder; and (ii) a request to transfer a payment amount of stable value digital asset tokens to the digital asset address of the at least one digital asset security token holder; (m) confirming, by the digital asset security token issuer system, that: (A) the digital asset address of the at least one digital asset security token holder is valid; (B) the digital asset security token amount of digital asset security tokens associated with the digital asset address of the at least one digital asset security token holder is more than zero; and (C) the at least one digital asset security token holder is entitled to payment; and (n) generating, at the digital asset security token issuer system, the first request based at least in part on the payment request when the digital asset address of the at least one digital asset security token holder is valid, the digital asset security token amount of digital asset security tokens associated with the digital asset address of the at least one digital asset security token holder is more than zero and the at least one digital asset security token holder is entitled to payment.

In embodiments, the first set of one or more computer readable media associated with the digital asset security token issuer system is operably connected to a node of the first plurality of geographically distributed computer systems in the first peer-to-peer network in the form of the first blockchain, wherein the node is maintained by the first digital asset security token issuer.

In embodiments, the digital asset security token database is maintained and stored on the first plurality of geographically distributed computer systems in the first peer-to-peer network in the form of the first blockchain.

In embodiments, the digital asset security token database is maintained on a sidechain, separate from the first blockchain, wherein information on the sidechain is published and stored on the first blockchain periodically or aperiodically.

In embodiments, the generating step (i) includes generating, by the Administrator computer system, transaction instructions for the first sum of stable value digital asset tokens to update the stable value digital asset token database to reserve stable value digital asset tokens in the amount of the first sum.

In embodiments, the payment amount relates to a dividend to be paid based on ownership of each digital asset security token.

In embodiments, the payment amount relates to a royalty to be paid based on ownership of each digital asset security token.

In embodiments, the payment amount relates to interest to be paid based on ownership of each digital asset security token.

In embodiments, the digital signature is based on at least two private keys associated with the Administrator.

In embodiments, the first request includes a first plurality of requests associated with a plurality of users, wherein each respective purchase request of the first plurality of purchase requests includes a respective request to purchase a respective sum stable value digital asset tokens.

In embodiments, the transaction instructions include a plurality of transaction instructions, each instruction being associated with a corresponding message including the digital signature based on the Administrator private key.

In embodiments, the digital signature is based on at least two private keys associated with the Administrator.

In embodiments, the first request is made by the first user device via a secure channel.

In embodiments, the first request is encrypted communication.

In embodiments, the first request is encrypted using an asymmetric key.

In embodiments, the asymmetric key is a PKI key.

In embodiments, the first request is encrypted using a symmetric key.

In embodiments, the first request is encrypted in accordance with Transport Layer Security protocol.

In embodiments, the first request is encrypted by the first user device.

In embodiments, the first request is encrypted by the Administrator computer system.

In embodiments, each notification is encrypted.

In embodiments, each notification is encrypted using an asymmetric key.

In embodiments, the asymmetric key is a PKI key.

In embodiments, each notification is encrypted using a symmetric key.

In embodiments, each notification is encrypted in accordance with Transport Layer Security protocol.

In embodiments, each notification is encrypted by the first user device.

In embodiments, each notification is encrypted by the Administrator computer system.

In embodiments, the stable value digital asset electronic ledger and the second digital asset electronic digital asset ledger are maintained by the Administrator computer system.

In embodiments, the stable value digital asset electronic ledger and the second digital asset electronic digital asset ledger are maintained in a single database.

In embodiments, the stable value digital asset electronic ledger and the second digital asset electronic digital asset ledger are maintained in separate databases.

In embodiments, the transaction instructions include a digital signature based on a private key associated with the Administrator computer system.

In embodiments, a method of issuing electronic payments using a stable value digital asset token on a digital asset security token may comprise the steps of: (a) providing a digital asset security token database stored on a first set of one or more computer readable media associated with a digital asset security token issuer system associated with a digital asset security token issuer, wherein the digital asset security token database comprises a log of digital asset security tokens including: (i) a first set of digital asset addresses including a respective digital asset address for each respective digital asset security token holder; and (ii) a respective digital asset security token amount associated with each respective digital asset address, wherein each respective digital asset address of the first set of digital asset addresses is tied to a first distributed public transaction ledger maintained by a first plurality of geographically distributed computer systems in a first peer-to-peer network in the form of a first blockchain; (b) providing a stable value digital asset token database stored on the first distributed public transaction ledger maintained by the first plurality of geographically distributed computer systems in the first peer-to-peer network in the form of the first blockchain, wherein the stable value digital asset token database comprises a log of stable value digital asset tokens including: (i) a second set of digital asset addresses including a second respective digital asset address for each respective stable value digital asset token holder; (ii) a respective stable value digital asset token amount for each respective stable value digital asset token holder, wherein the stable value digital asset tokens are issued by a stable value digital asset token issuer using a digital asset exchange computer system associated with a digital asset exchange; (c) receiving, by the digital asset exchange computer system, a first request from the digital asset security token issuer system to purchase a first sum of stable value digital asset tokens in exchange for a second sum of a second digital asset, wherein the first sum corresponds to the second sum based on a fixed notional amount, wherein the second digital asset is maintained on a second distributed public transaction ledger maintained by a second plurality of geographically distributed computer systems in a second peer-to-peer network in the form of a second blockchain; (d) verifying, by the digital asset exchange computer system, the first request, including: (i) verifying, by the digital asset exchange computer system, that the digital asset security token issuer is a registered user of the digital asset exchange; and (ii) verifying, by the digital asset exchange computer system, that the digital asset security token issuer has at least the second sum of the second digital asset available for transaction with the digital asset exchange as reflected in a second digital asset electronic ledger of the digital asset exchange computer system; (e) accessing, by the digital asset exchange computer system, the digital asset security token database to determine: (i) each respective digital asset address of the first set of digital asset addresses on the first blockchain for each respective digital asset security token holder; and (ii) the respective digital asset security token amount associated with each respective digital asset address; (f) determining a respective payment amount in stable value digital asset tokens to be made to each respective digital asset address of the first set of digital asset addresses based at least in part on the fixed notional amount, the first sum of stable value digital asset tokens, and the respective digital asset security token amount associated with each respective digital asset address of the first set of digital asset addresses; (g) generating, by the digital asset exchange computer system, transaction instructions for the first sum of stable value digital asset tokens by updating the stable value digital asset token database to reflect the addition of new stable value digital asset tokens in the amount of the first sum and the corresponding digital asset addresses associated with each new stable value digital asset token and a digital signature based on a private key associated with the digital asset exchange; (h) transferring, by the digital asset exchange computer system, the first sum of the stable value digital asset on a stable value digital asset electronic ledger from the user account of the digital asset security token issuer, to a custodial account of the digital asset exchange associated with stable value digital asset tokens; (i) generating, by the digital asset exchange computer system to the first blockchain, transaction instructions associated with crediting the respective payment amount of stable value digital asset tokens to each respective digital asset address of the first set of digital asset addresses; (j) publishing, by the digital asset exchange computer system to the first blockchain, the transaction instructions associated with crediting the respective payment amount of stable value digital asset tokens to each respective digital asset address of the first set of digital asset addresses, where ownership of each digital asset security token associated with each respective digital asset security token amount remains the same; and (k) notifying, by the digital asset exchange computer system, each digital asset address of the first set of the digital asset addresses of each respective transfer of stable value digital asset tokens to each respective digital asset address of the first set of digital asset addresses.

In embodiments, verifying the first request further includes: (iii) verifying, by the digital asset exchange computer system, the second sum of the second digital asset is associated with a public address on the second blockchain associated with the digital asset security token issuer.

In embodiments, the first blockchain is an Ethereum network.

In embodiments, the second blockchain is a Bitcoin network.

In embodiments, the second blockchain is a Bitcoin Cash network.

In embodiments, the second blockchain is a Stellar network.

In embodiments, the second blockchain is a Filecoin network.

In embodiments, the second blockchain is a Litecoin network.

In embodiments, the second blockchain is a Tezos network.

In embodiments, the second blockchain is a Zcash network.

In embodiments, the first blockchain is a Neo Network.

In embodiments, the first blockchain is an Ether Classic network.

In embodiments, the digital asset exchange is a regulated digital asset exchange.

In embodiments, the digital asset security token is a security registered with a government authority.

In embodiments, the digital asset security token is a debt security and the electronic payments are interest.

In embodiments, the digital asset security token is an equity security and the electronic payments are dividends.

In embodiments, the digital asset security token is secured by intellectual property rights and the electronic payments are royalties.

In embodiments, the second blockchain is based on a mathematical protocol for proof of work.

In embodiments, the second blockchain is based on a mathematical protocol for proof of stake.

In embodiments, the second blockchain is based on a cryptographic mathematical protocol.

In embodiments, the method may further comprise a step of publishing, by the digital asset exchange computer system to a side ledger, the transaction instructions associated with crediting the respective payment amount of stable value digital asset tokens to each respective digital asset address of the first set of digital asset addresses and the publishing step (j) includes publishing the transaction instructions from the side ledger to the first distributed public asset ledger periodically or aperiodically.

In embodiments, the method may further comprise steps of: (l) receiving, at the digital asset security token issuer system, from at least one digital asset security token holder, a payment request prior to the receiving step (c), the payment request including: (i) a digital asset address of the at least one digital asset security token holder; and (ii) a request to transfer a payment amount of stable value digital asset tokens to the digital asset address of the at least one digital asset security token holder; (m) confirming, by the digital asset security token issuer system, that. (A) the digital asset address of the at least one digital asset security token holder is valid; (B) the digital asset security token amount of digital asset security tokens associated with the digital asset address of the at least one digital asset security token holder is more than zero; and (C) the at least one digital asset security token holder is entitled to payment; and (n) generating, at the digital asset security token issuer system, the first request based at least in part on the payment request when the digital asset address of the at least one digital asset security token holder is valid, the digital asset security token amount of digital asset security tokens associated with the digital asset address of the at least one digital asset security token holder is more than zero and the at least one digital asset security token holder is entitled to payment.

In embodiments, the first set of one or more computer readable media associated with the digital asset security token issuer system is operably connected to a node of the first plurality of geographically distributed computer systems in the first peer-to-peer network in the form of the first blockchain, wherein the node is maintained by the first digital asset security token issuer.

In embodiments, the digital asset security token database is maintained and stored on the first plurality of geographically distributed computer systems in the first peer-to-peer network in the form of the first blockchain.

In embodiments, the digital asset security token database is maintained on a sidechain, separate from the first blockchain, wherein information on the sidechain is published and stored on the first blockchain periodically or aperiodically.

In embodiments, the generating step (i) includes generating, by the digital asset exchange computer system, transaction instructions for the first sum of stable value digital asset tokens to update the stable value digital asset token database to reserve stable value digital asset tokens in the amount of the first sum.

In embodiments, the payment amount relates to a dividend to be paid based on ownership of each digital asset security token.

In embodiments, the payment amount relates to a royalty to be paid based on ownership of each digital asset security token.

In embodiments, the payment amount relates to interest to be paid based on ownership of each digital asset security token.

In embodiments, the digital signature is based on at least two private keys associated with the digital asset exchange.

In embodiments, the first request includes a first plurality of requests associated with a plurality of users, wherein each respective purchase request of the first plurality of purchase requests includes a respective request to purchase a respective sum stable value digital asset tokens.

In embodiments, the transaction instructions include a plurality of transaction instructions, each instruction being associated with a corresponding message including the digital signature based on the digital asset exchange private key.

In embodiments, the digital signature is based on at least two private keys associated with the digital asset exchange.

In embodiments, the first request is made by the first user device via a secure channel.

In embodiments, the first request is encrypted communication.

In embodiments, the first request is encrypted using an asymmetric key.

In embodiments, the asymmetric key is a PKI key.

In embodiments, the first request is encrypted using a symmetric key.

In embodiments, the first request is encrypted in accordance with Transport Layer Security protocol.

In embodiments, the first request is encrypted by the first user device.

In embodiments, the first request is encrypted by the digital asset exchange computer system.

In embodiments, each notification is encrypted.

In embodiments, each notification is encrypted using an asymmetric key.

In embodiments, the asymmetric key is a PKI key.

In embodiments, each notification is encrypted using a symmetric key.

In embodiments, each notification is encrypted in accordance with Transport Layer Security protocol.

In embodiments, each notification is encrypted by the first user device.

In embodiments, each notification is encrypted by the digital asset exchange computer system.

In embodiments, the stable value digital asset electronic ledger and the second digital asset electronic digital asset ledger are maintained by the digital asset exchange computer system.

In embodiments, the stable value digital asset electronic ledger and the second digital asset electronic digital asset ledger are maintained in a single database.

In embodiments, the stable value digital asset electronic ledger and the second digital asset electronic digital asset ledger are maintained in separate databases.

In embodiments, the transaction instructions include a digital signature based on a private key associated with the digital asset exchange computer system.

In embodiments, a method of issuing electronic payments using a stable value digital asset token on a digital asset security token may comprise the steps of: (a) providing a digital asset security token database stored on a first set of one or more computer readable media associated with a digital asset security token issuer system associated with a digital asset security token issuer, wherein the digital asset security token database comprises a log of digital asset security tokens including: (i) a first set of digital asset addresses including a respective digital asset address for each respective digital asset security token holder; and (ii) a respective digital asset security token amount associated with each respective digital asset address, wherein each respective digital asset address of the first set of digital asset addresses is tied to a first distributed public transaction ledger maintained by a first plurality of geographically distributed computer systems in a first peer-to-peer network in the form of a first blockchain; (b) providing a stable value digital asset token database stored on the first distributed public transaction ledger maintained by the first plurality of geographically distributed computer systems in the first peer-to-peer network in the form of the first blockchain, wherein the stable value digital asset token database comprises a log of stable value digital asset tokens including: (i) a second set of digital asset addresses including a second respective digital asset address for each respective stable value digital asset token holder; (ii) a respective stable value digital asset token amount for each respective stable value digital asset token holder, wherein the stable value digital asset tokens are issued by a stable value digital asset token issuer using a digital asset token issuer computer system associated with a digital asset token issuer; (c) receiving, by the digital asset token issuer computer system, a first request from the digital asset security token issuer system to purchase a first sum of stable value digital asset tokens in exchange for a second sum of a second digital asset, wherein the first sum corresponds to the second sum based on a fixed notional amount, wherein the second digital asset is maintained on a second distributed public transaction ledger maintained by a second plurality of geographically distributed computer systems in a second peer-to-peer network in the form of a second blockchain; (d) verifying, by the digital asset token issuer computer system, the first request, including. (i) verifying, by the digital asset token issuer computer system, that the digital asset security token issuer is a registered user of the digital asset token issuer; and (ii) verifying, by the digital asset token issuer computer system, that the digital asset security token issuer has at least the second sum of the second digital asset available for transaction with the digital asset token issuer as reflected in a second digital asset electronic ledger of the digital asset token issuer computer system; (e) accessing, by the digital asset token issuer computer system, the digital asset security token database to determine: (i) each respective digital asset address of the first set of digital asset addresses on the first blockchain for each respective digital asset security token holder; and (ii) the respective digital asset security token amount associated with each respective digital asset address; (l) determining a respective payment amount in stable value digital asset tokens to be made to each respective digital asset address of the first set of digital asset addresses based at least in part on the fixed notional amount, the first sum of stable value digital asset tokens, and the respective digital asset security token amount associated with each respective digital asset address of the first set of digital asset addresses; (m) generating, by the digital asset token issuer computer system, transaction instructions for the first sum of stable value digital asset tokens by updating the stable value digital asset token database to reflect the addition of new stable value digital asset tokens in the amount of the first sum and the corresponding digital asset addresses associated with each new stable value digital asset token and a digital signature based on a private key associated with the digital asset token issuer; (n) transferring, by the digital asset token issuer computer system, the first sum of the stable value digital asset on a stable value digital asset electronic ledger from the user account of the digital asset security token issuer, to a custodial account of the digital asset token issuer associated with stable value digital asset tokens; (o) generating, by the digital asset token issuer computer system to the first blockchain, transaction instructions associated with crediting the respective payment amount of stable value digital asset tokens to each respective digital asset address of the first set of digital asset addresses; (p) publishing, by the digital asset token issuer computer system to the first blockchain, the transaction instructions associated with crediting the respective payment amount of stable value digital asset tokens to each respective digital asset address of the first set of digital asset addresses, where ownership of each digital asset security token associated with each respective digital asset security token amount remains the same; and (q) notifying, by the digital asset token issuer computer system, each digital asset address of the first set of the digital asset addresses of each respective transfer of stable value digital asset tokens to each respective digital asset address of the first set of digital asset addresses.

In embodiments, the first blockchain is an Ethereum network.

In embodiments, the second blockchain is a Bitcoin network.

In embodiments, the second blockchain is a Bitcoin Cash network.

In embodiments, the second blockchain is a Stellar network.

In embodiments, the second blockchain is a Filecoin network.

In embodiments, the second blockchain is a Litecoin network.

In embodiments, the second blockchain is a Tezos network.

In embodiments, the second blockchain is a Zcash network.

In embodiments, the first blockchain is a Neo Network.

In embodiments, the first blockchain is an Ether Classic network.

In embodiments, the digital asset exchange is a regulated digital asset exchange.

In embodiments, the digital asset security token is a security registered with a government authority.

In embodiments, the digital asset security token is a debt security and the electronic payments are interest.

In embodiments, the digital asset security token is an equity security and the electronic payments are dividends.

In embodiments, the digital asset security token is secured by intellectual property rights and the electronic payments are royalties.

In embodiments, the second blockchain is based on a mathematical protocol for proof of work.

In embodiments, the second blockchain is based on a mathematical protocol for proof of stake.

In embodiments, the second blockchain is based on a cryptographic mathematical protocol.

In embodiments, the method may further comprise a step of publishing, by the digital asset token issuer computer system to a side ledger, the transaction instructions associated with crediting the respective payment amount of stable value digital asset tokens to each respective digital asset address of the first set of digital asset addresses and the publishing step (j) includes publishing the transaction instructions from the side ledger to the first distributed public asset ledger periodically or aperiodically.

In embodiments, the method may further comprise steps of: (l) receiving, at the digital asset security token issuer system, from at least one digital asset security token holder, a payment request prior to the receiving step (c), the payment request including: (i) a digital asset address of the at least one digital asset security token holder; and (ii) a request to transfer a payment amount of stable value digital asset tokens to the digital asset address of the at least one digital asset security token holder; (m) confirming, by the digital asset security token issuer system, that: (A) the digital asset address of the at least one digital asset security token holder is valid; (B) the digital asset security token amount of digital asset security tokens associated with the digital asset address of the at least one digital asset security token holder is more than zero; and (C) the at least one digital asset security token holder is entitled to payment; and (n) generating, at the digital asset security token issuer system, the first request based at least in part on the payment request when the digital asset address of the at least one digital asset security token holder is valid, the digital asset security token amount of digital asset security tokens associated with the digital asset address of the at least one digital asset security token holder is more than zero and the at least one digital asset security token holder is entitled to payment.

In embodiments, the first set of one or more computer readable media associated with the digital asset security token issuer system is operably connected to a node of the first plurality of geographically distributed computer systems in the first peer-to-peer network in the form of the first blockchain, wherein the node is maintained by the first digital asset security token issuer.

In embodiments, the digital asset security token database is maintained and stored on the first plurality of geographically distributed computer systems in the first peer-to-peer network in the form of the first blockchain.

In embodiments, the digital asset security token database is maintained on a sidechain, separate from the first blockchain, wherein information on the sidechain is published and stored on the first blockchain periodically or aperiodically.

In embodiments, the generating step (i) includes generating, by the digital asset token issuer computer system, transaction instructions for the first sum of stable value digital asset tokens to update the stable value digital asset token database to reserve stable value digital asset tokens in the amount of the first sum.

In embodiments, the payment amount relates to a dividend to be paid based on ownership of each digital asset security token.

In embodiments, the payment amount relates to a royalty to be paid based on ownership of each digital asset security token.

In embodiments, the payment amount relates to interest to be paid based on ownership of each digital asset security token.

In embodiments, the digital signature is based on at least two private keys associated with the digital asset token issuer.

In embodiments, the first request includes a first plurality of requests associated with a plurality of users, wherein each respective purchase request of the first plurality of purchase requests includes a respective request to purchase a respective sum stable value digital asset tokens.

In embodiments, the transaction instructions include a plurality of transaction instructions, each instruction being associated with a corresponding message including the digital signature based on the digital asset token issuer private key.

In embodiments, the digital signature is based on at least two private keys associated with the digital asset token issuer.

In embodiments, the first request is made by the first user device via a secure channel.

In embodiments, the first request is encrypted communication.

In embodiments, the first request is encrypted using an asymmetric key.

In embodiments, the asymmetric key is a PKI key.

In embodiments, the first request is encrypted using a symmetric key.

In embodiments, the first request is encrypted in accordance with Transport Layer Security protocol.

In embodiments, the first request is encrypted by the first user device.

In embodiments, the first request is encrypted by the digital asset token issuer computer system.

In embodiments, each notification is encrypted.

In embodiments, each notification is encrypted using an asymmetric key.

In embodiments, the asymmetric key is a PKI key.

In embodiments, each notification is encrypted using a symmetric key.

In embodiments, each notification is encrypted in accordance with Transport Layer Security protocol.

In embodiments, each notification is encrypted by the first user device.

In embodiments, each notification is encrypted by the digital asset token issuer computer system.

In embodiments, the stable value digital asset electronic ledger and the second digital asset electronic digital asset ledger are maintained by the digital asset token issuer computer system.

In embodiments, the stable value digital asset electronic ledger and the second digital asset electronic digital asset ledger are maintained in a single database.

In embodiments, the stable value digital asset electronic ledger and the second digital asset electronic digital asset ledger are maintained in separate databases.

In embodiments, the transaction instructions include a digital signature based on a private key associated with the digital asset token issuer computer system.

Additional Examples

The following examples illustrate embodiments of the present invention. They are not intended to be limiting. It will be appreciated by those of skill in the art that embodiments may be applied to other use cases not specifically called out herein, without departing from the present invention.

Additional Example 1: Real Estate Investment Trust (REIT) Token

In embodiments, shares in a real estate investment trust ("REIT Trust") may be issued using a digital asset, such as a token on the ETHER Network ("REIT Token"). The REIT Trust may hold income generating property such as real estate which is leased. As the income generating property generates fiat profits which are intended to be distributed to shareholders, a corresponding amount of fiat is to be deposited with a digital asset exchange, such as a regulated digital asset exchange like Gemini. The fiat is then converted into a SVCoin by the Exchange. The SVCoin may then be distributed on a pro-rata basis (or as otherwise instructed by the REIT Trust) to REIT Token holders at the respective REIT Token holder's digital asset addresses associated with the ETHER Wallet holding the REIT Token.

In embodiments, the income generating property may generate profits in the form of digital assets. For example, one or more individuals may pay rent in one or more of: an SVCoin, a fiat-backed digital asset, a digital math-based asset, a digital asset, and/or a combination thereof, to name a few. The profits generated, which may be intended to be distributed to shareholders, may be deposited with a digital asset exchange and/or a digital asset exchange computer system, such as a regulated digital asset exchange like Gemini. In the case where profits are collected in SVCoin, the SVCoin may be distributed on a pro-rata basis (or as otherwise instructed by the REIT Trust) to REIT Token holders at the respective REIT Token holder's digital asset addresses associated with the ETHER Wallet holding the REIT Token. In the case where profits are not collected in SVCoin, the digital assets may be converted into a SVCoin by the digital asset exchange. The SVCoin may then be distributed on a pro-rata basis (or as otherwise instructed by the REIT Trust) to REIT Token holders at the respective REIT Token holder's digital asset addresses associated with the ETHER Wallet holding the REIT Token.

REIT Token holders may then use the SVCoin as a digital asset to conduct other transactions. Eventually, the SVCoin can be exchanged for fiat at the exchange based on the notional value (e.g., 1 SVCoin=1 dollar).

Additional Example 2: Energy Master Limited Partnership (Energy MLP) Tokens

In embodiments, shares in an Energy Master Limited Partnership ("Energy MLP") may be issued using a digital asset, such as a token on the ETHER Network ("Energy MLP Token"). The Energy MLP may offer shares (otherwise known as "units") in the form of a digital asset, such as Energy MLP Tokens that are publicly traded and which generate dividends to the shareholders. As the dividends are distributed on a periodic basis in the form of fiat currency, a corresponding amount of flat is deposited with a digital asset exchange, such as a regulated digital asset exchange like Gemini. The fiat is then converted into a SVCoin by the Exchange. The SVCoin may then be distributed on a pro-rata basis (or as otherwise instructed by the Energy MLP) to Energy MLP Token holders at the respective Energy MLP Token holder's digital asset addresses associated with the ETHER Wallet holding the Energy MLP Token.

Energy MLP Token holders may then use the SVCoin as a digital asset to conduct other transactions. Eventually, the SVCoin can be exchanged for fiat at the exchange based on the notional value (e.g., 1 SVCoin=1 dollar).

Additional Example 3: Equity Security Tokens

In embodiments, equity shares corresponding to a stock certificate in an entity may be issued using a digital asset, such as a token on the ETHER Network ("Equity Token"). As dividends based on the Equity Token are generated for distribution to shareholders, a corresponding amount of fiat is to be deposited with a digital asset exchange, such as a regulated digital asset exchange like Gemini. The fiat is then converted into a SVCoin by the Exchange. The SVCoin may then be distributed on a pro-rata basis (or as otherwise instructed by the entity distributing the shares) to Equity Token holders at the respective Equity Token holder's digital asset addresses associated with the ETHER Wallet holding the Equity Token.

Equity Token holders may then use the SVCoin as a digital asset to conduct other transactions. Eventually, the SVCoin can be exchanged for fiat at the exchange based on the notional value (e.g., 1 SVCoin=1 dollar).

Additional Example 4: Venture Capital (VC) Tokens

In embodiments, shares in a Venture Capital fund ("VC Fund") may be issued using a digital asset, such as a token on the ETHER Network ("VC Token"). As the VC Fund generates returns to be distributed to investors in the VC Fund, a corresponding amount of fiat is to be deposited with a digital asset exchange, such as a regulated digital asset exchange like Gemini. The fiat is then converted into a SVCoin by the Exchange. The SVCoin may then be distributed on a pro-rata basis (or as otherwise instructed by the VC Fund) to VC Token holders at the respective VC Token holder's digital asset addresses associated with the ETHER Wallet holding the VC Token.

VC Token holders may then use the SVCoin as a digital asset to conduct other transactions. Eventually, the SVCoin can be exchanged for fiat at the exchange based on the notional value (e.g., 1 SVCoin=1 dollar).

Additional Example 5: Private Equity (PE) Tokens

In embodiments, shares in a Private Equity fund ("PE Fund") may be issued using a digital asset, such as a token on the ETHER Network ("PE Token"). As the PE Fund generates returns to be distributed to investors in the PE Fund, a corresponding amount of fiat is to be deposited with a digital asset exchange, such as a regulated digital asset exchange like Gemini. The fiat is then converted into SVCoin by the Exchange. The SVCoin may then be distributed on a pro-rata basis (or as otherwise instructed by the PE Fund) to PE Token holders at the respective PE Token holder's digital asset addresses associated with the ETHER Wallet holding the PE Token.

PE Token holders may then use the SVCoin as a digital asset to conduct other transactions. Eventually, the SVCoin can be exchanged for fiat at the exchange based on the notional value (e.g., 1 SVCoin=1 dollar).

Additional Example 6: Digital Certificate of Deposit (CD) Tokens

In embodiments, digital certificate of deposits ("Digital CD") may be issued using a digital asset, such as a token on the ETHER Network ("CD Token"). As interest amounts are generated based on the terms of the certificate of deposits, a corresponding amount of fiat is to be deposited with a digital asset exchange, such as a regulated digital asset exchange like Gemini. The fiat is then converted into a SVCoin by the Exchange. Upon maturity of the Digital CD (or before maturity), the SVCoin may then be distributed on a pro-rata basis (or as otherwise instructed by the Digital CD issuer and/or less any premature withdrawal penalty) to CD Token holders at the respective CD Token holder's digital asset addresses associated with the ETHER Wallet holding the CD Token.

CD Token holders may then use the SVCoin as a digital asset to conduct other transactions. Eventually, the SVCoin can be exchanged for fiat at the exchange based on the notional value (e.g., 1 SVCoin=1 dollar).

Additional Example 7: Digital Bond Tokens

In embodiments, digital bonds may be issued using a digital asset, such as a token on the ETHER Network ("Bond Token"). As interest amounts are generated based on the coupon rates of the digital bonds, a corresponding amount of fiat is to be deposited with a digital asset exchange, such as a regulated digital asset exchange like Gemini. The fiat is then converted into SVCoin by the Exchange. The SVCoin may then be distributed on a pro-rata basis (or as otherwise instructed by the digital bond issuer) to Bond Token holders at the respective Bond Token holder's digital asset addresses associated with the ETHER Wallet holding the Bond Token.

Bond Token holders may then use the SVCoin as a digital asset to conduct other transactions. Eventually, the SVCoin can be exchanged for fiat at the exchange based on the notional value (e.g., 1 SVCoin=1 dollar).

Additional Example 8: Peer-to-Peer Lending (P2P) Tokens

In embodiments, a peer-to-peer lending service ("P2P Service") may issue a digital asset, such as a token on the ETHER Network ("P2P Loan Token"). As lending amounts and interest payments are distributed, corresponding amounts of fiat is deposited with a digital asset exchange, such as a regulated digital asset exchange like Gemini. The fiat is then converted into SVCoin by the Exchange. The SVCoin may then be distributed on a pro-rata basis (or as otherwise instructed by the lender/borrower) to P2P Loan Token holders at the respective P2P Loan Token holder's digital asset addresses associated with the ETHER Wallet holding the P2P Loan Token.

P2P Loan Token holders may then use the SVCoin as a digital asset to conduct other transactions. Eventually, the SVCoin can be exchanged for fiat at the exchange based on the notional value (e.g., 1 SVCoin=1 dollar).

Additional Example 9: Crowdfunding (CF) Tokens

In embodiments, a Crowdfunding service may issue a digital asset, such as a token on the ETHER Network ("CF Token"). As funds are collected, a corresponding amount of fiat is to be deposited with a digital asset exchange, such as a regulated digital asset exchange like Gemini. The fiat is then converted into a SVCoin by the Exchange. The SVCoin may then be distributed on a pro-rata basis (or as otherwise instructed by the Crowdfunding service) to CF Token holders at the respective CF Token holder's digital asset addresses associated with the ETHER Wallet holding the CF Token.

CF Token holders may then use the SVCoin as a digital asset to conduct other transactions. Eventually, the SVCoin can be exchanged for fiat at the exchange based on the notional value (e.g., 1 SVCoin=1 dollar).

Additional Example 10: Real Estate Crowdsourcing Tokens

In embodiments, a Real Estate Crowdsourcing services may issue a digital asset, such as a token on the ETHER Network ("RE Token"). As funds are collected, a corresponding amount of fiat is to be deposited with a digital asset exchange, such as a regulated digital asset exchange like Gemini. The fiat is then converted into a SVCoin by the Exchange. The SVCoin may then be distributed on a pro-rata basis (or as otherwise instructed by the Real Estate Crowdsourcing service) to RE Token holders at the respective RE Token holder's digital asset addresses associated with the ETHER Wallet holding the RE Token. RE Token holders may then use the SVCoin as a digital asset to conduct other transactions. Eventually, the SVCoin can be exchanged for fiat at the exchange based on the notional value (e.g., 1 SVCoin=1 dollar).

Additional Example 11: Artistic/Digital Rights Payment Tokens

In embodiments, tokens may be issued against an artistic work, such as a song or movie (DR Token), for example, as a token on the ETHEREUM network. As royalties are collected for use of the song or movie, a corresponding amount of fiat may be deposited with a digital asset exchange. The fiat may be converted into SVCoin and distributed on a pro-rata basis to the rights holders who are DR Token holders. More specifically, the SVCoin may be transferred to the digital asset address associated with a wallet of a DR Token holder as a payment of royalties.

In embodiments, of the examples discussed above, the token holders may instigate payment of SVCoin by sending a request for payment. In this case, any transaction fees will be the responsibility of the token holder. In embodiments, the token issuer, or an agent thereof, may implement or instruct distribution of payments in which case transaction fees are the responsibility of the token issuer.

Setup and Storage of Digital Assets and/or Digital Wallets

Digital asset accounts may be securely generated, accessed, and/or used (e.g., for transactions) from a secure administrative portal. In embodiments, the administrative portal, which may be used for key generation, parsing, and/or reassembly, may be a secure system for transacting in digital math based assets comprising a first computer system comprising one or more processors that generate one or more digital wallets and one or more respective private keys and one or more respective public keys, each of the one or more private keys being segmented into one or more private key segments; one or more writing devices operatively connected to the one or more first computer systems, each of the one or more writing devices adapted to write at least one private key segment of a corresponding one of the one or more private keys, along with information correlating the at least one private key segment to one of the one or more public keys; and at least one networked computer comprising one or more processors that access at least one of the digital wallets using a corresponding one of the one or more private keys as reassembled using the corresponding private key segments.

In embodiments, the administrative portal may further comprise a second computer system comprising one or more processors for reassembling the corresponding one of the one or more private keys based on input into the second computer system of the corresponding private key segments. In embodiments, the input device may be a scanner, a keyboard, a touchscreen, a mouse, a microphone, a camera, and/or a digital card reader, to name a few.

In embodiments, the first computer system of the administrative portal and/or the second computer system may not be associated with a network. In embodiments, the first computer system of the administrative portal and the networked computer system may be a common computer system. In embodiments, the second computer system of the administrative portal and the networked computer system may comprise a common computer system. In further embodiments, the first computer system, the second computer system, and the networked computer system may be a common computer system.

In embodiments, referring to FIGS. 29A-29D, the administrative portal may comprise an accounting computer 25 and a secure location 10, as described herein.

Figure 29A:
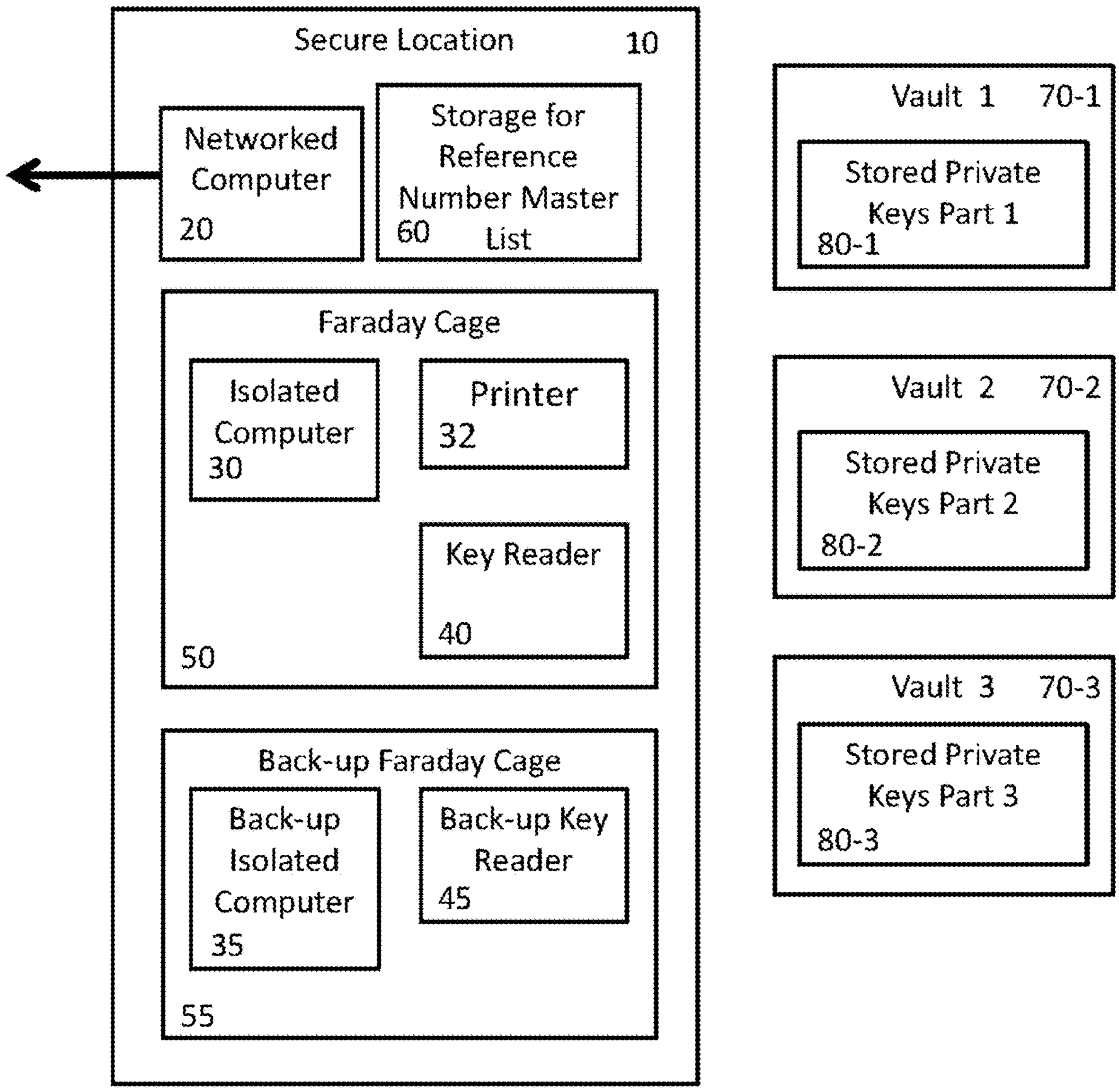
FIGS. 29A-29D are exemplary block diagrams of components of security systems for an ETP holding digital math-based assets in accordance with various exemplary embodiments of the present invention.

Referring to the exemplary embodiment illustrated in FIG. 29A, at a secure location 10, a digital asset account holder, administrator, manager, and/or custodian may maintain at least two computers. In embodiments, an administrator, manager, and/or custodian may be contracted to manage one or more digital asset accounts and/or oversee security for the accounts. In embodiments, secure location 10 may be a room with restricted entry. In embodiments, secure location 10 may have a user entry log to provide an access record for the location.

In the exemplary embodiment depicted in FIG. 29A, at secure location 10, the first computer may be a networked computer 20, which may comprise one or more computing devices. Networked computer 20 and/or other computers in the system may have the ability to cycle or otherwise change IP addresses. The second computer may be a non-networked, isolated computer 30, which may comprise one or more computing devices. In embodiments, the networked computer 20 and the isolated computer 30 may be separate aspects of one computing device. For example, a hard drive partition may be used to separate the networked and non-networked functions. In embodiments, the computers may comprise one or more processors and/or computer readable memory. Networked computer 20 and isolated computer 30 may be located in close proximity to each other, as in the same room, or may be located in separate locations within secure location 10. It will be appreciated by those in the art that secure location 10 may comprise a plurality of secure locations. In embodiments, isolated computer 30 may be located in a Faraday cage 50. The Faraday cage 50 may prevent electronic eavesdropping or interference from electromagnetic waves. In alternative embodiments, the functions ascribed above to networked computer 20 and isolated computer 30 may be performed by one or more networked and/or isolated computers at one or more locations.

In the exemplary embodiment depicted in FIG. 29A, networked computer 20 can communicate with a registry, exchange, other external entities, e.g., APs, and/or all or part of a digital asset network to send and/or receive digital assets (e.g., to create transactions), to compute balances, and/or to transmit or otherwise broadcast signed or otherwise finalized transactions. In embodiments, networked computer 20 may be used to distribute digital assets among one or more digital asset accounts and/or digital wallets. The networked computer 20 may be connected to the Internet directly (e.g., through Ethernet, Wi-Fi, Bluetooth, or any connection known in the art or hereafter developed) or indirectly (e.g., through another computer to which it is directly connected), or may be connected to a network other than the Internet.

In embodiments, the digital assets may be stored in one or more digital wallets residing on one or more computing devices, such as remote servers, personal computers, tablet devices, mobile devices, such as smart phones, or PDAs, to name a few. In the exemplary embodiment of FIG. 29A, isolated computer 30 may be used to generate electronic wallets and/or key pairs, which may include both private and public keys. In embodiments, keys comprise strings or alphanumeric characters or other characters, optionally of a pre-determined length, may comprise one or more pieces of computer code, or may comprise other formats of keys known in the art. In embodiments, digital wallets may be created on isolated computer 30 using a "clean-boot" with a bootable CD, such as a Linux Live CD. The specific version of the operating system may be maintained in secret to avoid security risks.

In embodiments, digital asset accounts and/or digital wallets may be generated by an entity upon receipt of a request to transfer digital assets to the entity and/or may be pre-generated at the time that security measures (e.g., a vault storage system) is set up, to name a few. The digital asset accounts each may be associated with unique private-public key pairs (which may include a plurality of private keys). In embodiments, the key pairs may be created as part of the digital wallet creation process. In other embodiments, the key pairs may be created before or after the creation of the one or more digital wallets and associated with the wallets as a separate step. In embodiments, the assets stored in a digital wallet may be accessed with a key pair, even if the original wallet is destroyed or otherwise unavailable. In such embodiments, only the key pair need be maintained and/or stored to retrieve the assets associated with a given digital wallet. Accordingly, in an embodiment of the present invention, digital wallets may be deleted or otherwise destroyed following the storage of their associated keys. Assets may be added to the wallet even after its destruction using the public key. Assets may thus be stored in a wallet after the wallet is destroyed. The wallet may be re-generated using its keys.

In embodiments, the private key may not be used directly with or on the networked computer 20. In embodiments, a public key (without the corresponding private key) may only be able to receive digital assets for deposit purposes. In embodiments, assets may be transferred to a wallet using its public key and without the transferor knowing the private key. Implementation of the foregoing may require customized software, e.g., software that modifies the standard digital asset protocols.

In embodiments, isolated computer 30 may also be used in conjunction with, e.g., one or more printers or other writing devices, to print the key pairs or may be used otherwise to arrange for the storage of one or more aspects and/or portions (or segments or coded and/or encrypted segments) of the key pairs. A printer 32 or other writing device to write, print, or otherwise store the keys may be provided with the isolated computer 30. Such printer(s) and/or other writing device(s) may be connected, directly and/or indirectly, to the isolated computers, such as through hardwire, wireless, or other connection. That device may also be located within a Faraday cage, which may be the same Faraday cage housing isolated computer 30. Storage of the keys is described further below.

In embodiments, one or more isolated computers 30 can be used in conjunction with one or more printers or other writing devices to write, print or otherwise store keys. It will be appreciated by one of skill in the art, that in embodiments, it may be desirable to limit the number of printers or other writing devices to as few as possible to reduce risk of exposure of private keys, while in embodiments, it may be desirable to have a larger number of printers or other writing devices to handle the volume of wallets and/or keys that need to be generated and/or written by the system for its operation.

Private keys may be stored in the selected format along with their corresponding public keys. In embodiments, the private key may be stored with a reference number which may correlate the private key to its corresponding public key. The reference number may be (or may be stored as) a number, alphanumeric code, bar code, QR code, to name a few. A reference number master list may identify a private key, the reference number, and the corresponding public key. The reference number master list may be printed or etched on paper or some other substrate, may be stored digitally on a tape CD, DVD, computer hard drive, or other medium, or otherwise stored in a manner known in the art. The substrates or media just described may have any suitable size, including microscopic or nano scales. In embodiments, the reference number master list may be stored in a secure storage chamber 60 at secure location 10. Storage chamber 60 may be a lockbox, fireproof box, or other secure chamber. If storage is electronic or digital, chamber 60 may protect against electromagnetic waves.

The private and/or public keys and/or any reference number may be stored in a variety of formats, as described herein. The keys may be divided into separate segments for storage. For example, a 51-character key may be divided into three 17-character segments. The same reference number that correlates the private key to the public key or an additional reference number or other identifier may indicate which key segments are part of the same key. The reference identifier or another identifier may be provided and stored with the one or more segments to indicate their order in the assembled key. A numbering schema or other convention may also be used to identify the order of key segments. For example, a first segment may begin with an "A", a second segment may begin with a "B", and a third segment may begin with a "C". The key segments may be stored in one or more locations. In embodiments, the key segments may be divided among a plurality of vaults 70, as described herein.

In embodiments, keys and/or key segments may be stored digitally and/or electronically, e.g., on one or more computer hard drive, disk, tape, memory card, flash memory, CD-ROM, and/or DVD, to name a few. In embodiments, the keys and/or key segments may be printed on any substrate, including paper, papyrus, plastic, and/or any substrate known in the art. In embodiments, the substrate may be fireproof or fire resistant, such as a fireproof plastic. The substrate may be resistant to fluids, e.g., water resistant, or otherwise nonabsorbent. Other printing options may be holographic printing, three-dimensional printing, raised printing, such as Braille lettering, and/or invisible ink printing, such as using inks that require a special light and/or treatment, e.g., heat and/or chemicals, for viewing. In embodiments, keys may be etched, e.g., in wood, metal, glass, plastic, or other compositions known in the art, e.g., to produce a card. In embodiments, a magnetic encoding may be used to write to the card. In embodiments, etched or printed keys or key segments may take any shape, such as coin-shaped tokens or rectangular blocks, to name a few. In embodiments, keys or key segments may be printed, etched, or otherwise stored as alphanumeric strings. In embodiments, keys or key segments may be printed, etched, or otherwise stored in a form readable by programmed devices, such as scanners. Such a form may be a QR code, a bar code, another available scannable code format and/or a proprietary code format. In embodiments, quality control operations may ensure that the keys or key segments are printed accurately and/or are able to be read. In embodiments, printed or etched keys or key segments may be coated to prevent reading the key without removing or otherwise altering the coating. Such a coating may be a UV coating and/or may block X-rays or other forms of scanning or reading. The coating may be scratched off to reveal the data contained below it. The back of the substrate may also be coated to prevent reading through the substrate. Such a coating may provide an indication of whether a printed key or key segment was accessed or attempted to be accessed (e.g., it can be detected whether someone scratched the coating away).

In embodiments, security measures may be established and implemented to reduce the risk of digital wallets being compromised. Further, redundancies can be put in place to provide and/or help ensure that any information necessary to access digital math-based assets in digital wallets can be maintained and/or accessed by the account holders as appropriate, necessary, and/or desired.

Multiple private keys may be required to access a digital wallet. Multiple keys may be stored in the same manner as key segments. In embodiments, where a second private key is required, the one or more individuals or systems providing the second key may be located in different administrative portals, different rooms, and/or different geographies from the one or more individuals or systems providing the first private key. Accordingly, a plurality of administrative portals may be employed by secure digital asset storage systems in accordance with the present invention. In embodiments, a plurality of portals may be used for retrieval of stored digital assets (e.g., by requiring a signature or private key from at least two individuals located in at least two different portals). In embodiments, one portal may be used for re-assembling key segments and thus providing one private key, and an individual in a second location may be required to provide a second key or signature before a digital wallet may be accessed. The second key or signature may be encrypted and/or segmented as described herein with respect to a single private key.

In embodiments, a digital wallet may have more than one private key (e.g., multi-signature wallets). The plurality of private keys may be stored securely in the same manner as a single private key. Each private key segment pertaining to a single wallet may be stored in separate vaults, which may be electronic and/or physical vaults. By allowing for multi-signature wallets, the wallet can provide for approval/signature authority from more than one individual or entity as a further means to control access to digital assets held in such wallet. In embodiments, a signature authority may be an automated electronic signature authority, such as a computer or computer system programmed with transaction approval rules. The automated electronic signature authority may only provide a signature when a transaction satisfies the transaction approval rules. In other embodiments, required signature authorities may be individuals who may be located in different administrative portals, different rooms, and/or different geographies. Accordingly, a plurality of administrative portals may be employed by secure digital asset storage systems in accordance with the present invention. In embodiments, one portal may be used for re-assembling key segments and thus providing one private key, and an individual or system in a second location may be required to provide a second key or signature before a digital wallet may be accessed. The second location may be a second portal, a location in a different building, and/or a different geography, to name a few. The second key or signature may be encrypted and/or segmented as described herein with respect to a single private key.

Keys or key segments may be encrypted and/or ciphered, using one or more ciphers, as an additional security measure. The encryption and/or ciphers may be applied by computers running encryption software, separate encryption devices, or by the actions of one or more persons, e.g., prior to input of the encrypted and/or ciphered data into one or more computers. In embodiments, a key may be stored in reverse order and/or translated (e.g., by adding 1 to each digit and/or advancing each alphabetic character by one position in the Western alphabet, by substitution such as by mapping each character to a different character (e.g., A=3, 5=P, to name a few), to name a few). In embodiments, other encryption algorithms can comprise scrambling of a sequence of characters, addition of characters, and/or hashing. Other encryption techniques are possible. See, e.g., David Kahn, The Codebreakers: The Story of Secret Writing, 1967, ISBN 0-684-83130-9. See also, Bruce Schneier, Applied Cryptography, John Wiley & Sons, 1994, ISBN: 0-471-59756-2. The encryption and/or ciphers may protect against use of the keys by an unauthorized entity who obtains the keys or key segments or copies thereof. The encoding and/or cipher may be maintained in secret and applied to decrypt or decode the keys only when keys must be accessed and used. In embodiments, ciphering may refer to an alphanumeric translation or reordering, while encryption may refer to higher level algorithms, including hashing algorithms. In embodiments, encryption and ciphering may refer to the same processes, in which case descriptions herein of processes involving both encryption and ciphering steps may only entail performance of one such step so as not to be repetitive.

Following storage of the key pairs, the key pairs may be erased from isolated computer 30. Erasure may occur using the computer operating system's delete features, customized software or computer code designed to remove the data from computer memory, magnets used to physically erase the data from the computer's storage drives, and/or other techniques known in the art.

A key reader 40 may be provided to assemble, read, and/or de-crypt the keys or key segments. The key reader 40 may be contained within a Faraday cage, which may be the same Faraday cage housing isolated computer 30. The key reader 40 may read keys that are printed, etched, digitally stored, or otherwise stored. Key reader 40 may be a scanner (e.g., photo scanner or bar code scanner), QR reader, laser, computer hardware, CD reader, and/or digital card reader, to name a few. Key reader 40 may include or be operationally connected to a microscope or magnifying device, such as for keys that are printed in microscopic sizes or other small sizes. In embodiments, key reader 40 may be paired with optical character recognition ("OCR") technology to create digitally recognized copies of keys that may have been printed, etched, or otherwise stored in a form not immediately readable by a computer.

In embodiments, key reader 40 may comprise an input device, such as a keyboard, touchscreen, mouse, and/or microphone, to name a few. An input device may be used for manual entry of keys and/or key segments into one or more computers so that the computer may further process the key segments. Key reader 40 may be operationally connected to isolated computer 30, which may be a direct connection (e.g., a USB cable, Ethernet cable, Bluetooth, or Wi-Fi, to name a few). In embodiments, key reader 40 may be operationally connected to networked computer 20. Key reader 40 may be operationally connected to a separate computing device.

In embodiments, reassembled keys may be input directly into a networked computer 20, which may then be used to access one or more digital wallets and/or perform one or more transactions. Key reader 40 and/or corresponding software (e.g., running on a computer operationally connected to the key reader) may be programmed or otherwise designed to assemble key segments into completed keys. Key reader 40 and/or corresponding software (e.g., running on a computer operationally connected to the key reader) may also correlate the private keys with their corresponding public keys, optionally using the reference number master list. In embodiments, one or more pieces of software may be used to retrieve, decrypt, assemble, and/or decipher keys and/or key segments. In embodiments, such software may be run on any of one or more secure storage system computers and/or user devices. In embodiments, multiple authority may be required to initiate a retrieval of stored private keys.

Figure 29B:
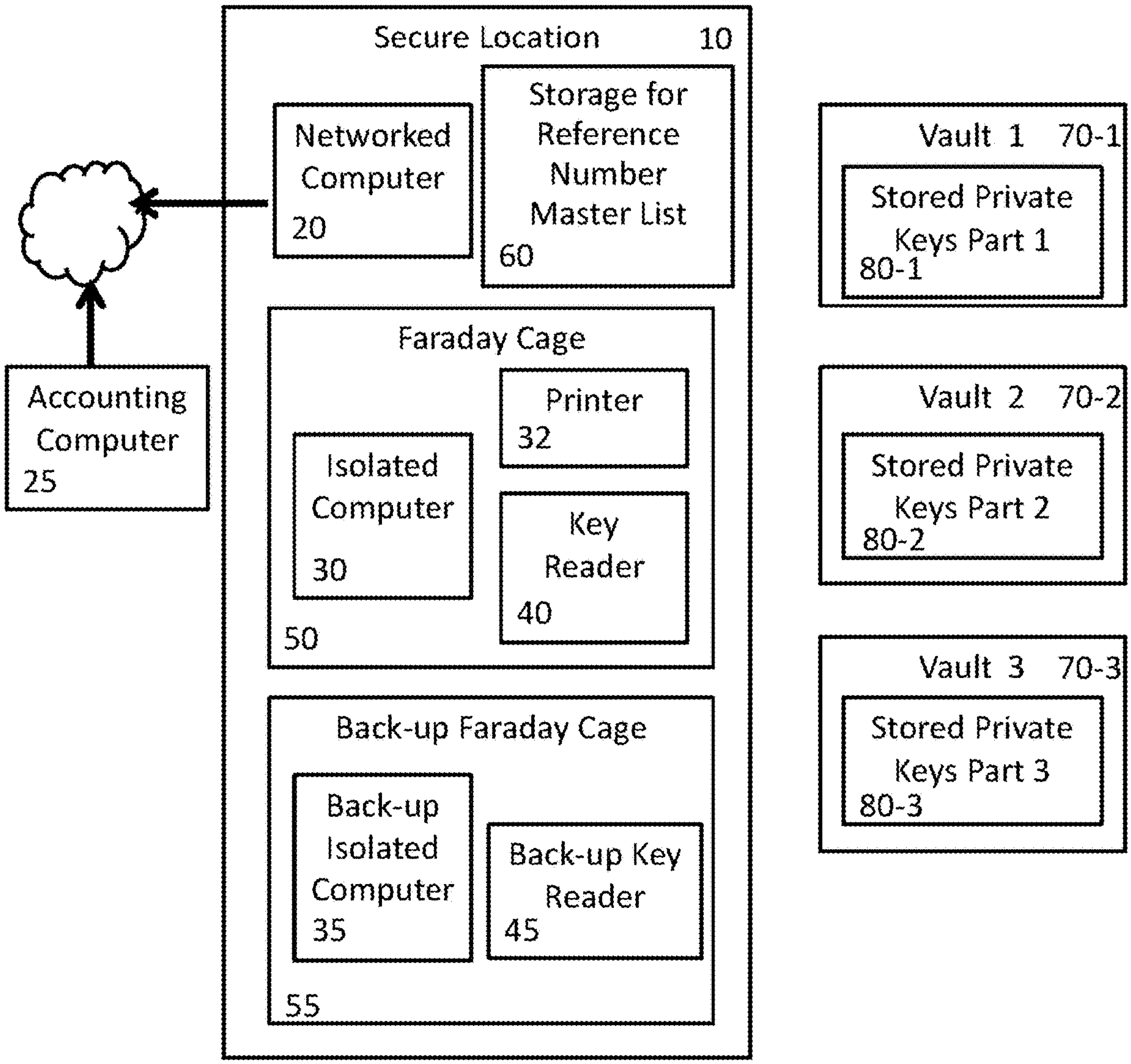
Figure 29C:
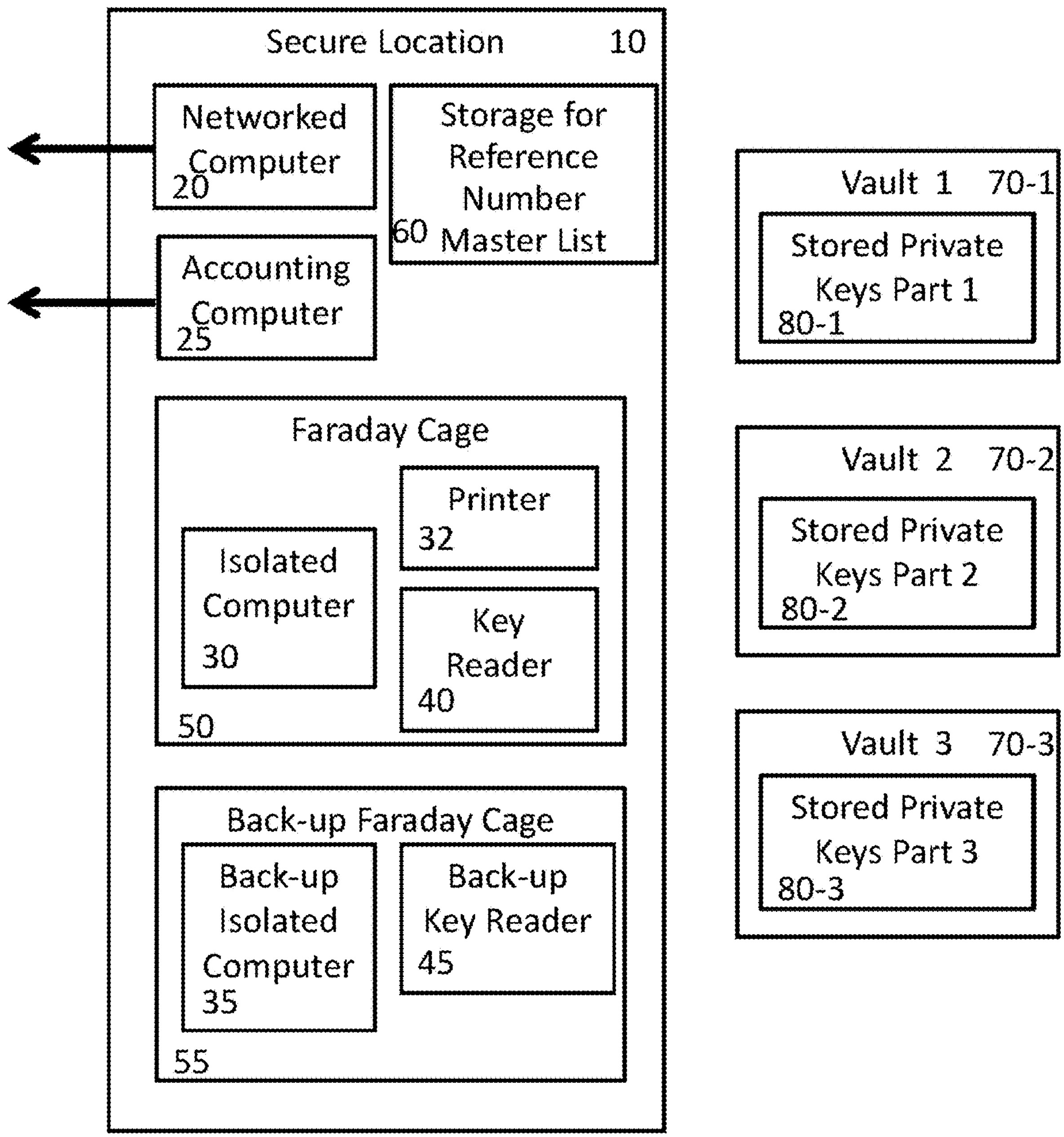

In embodiments, a back-up isolated computer 35 and/or a back-up key reader 45 may be provided at secure location 10, as illustrated in FIGS. 29A-29C. The back-up isolated computer 35 and key reader 45 may be contained in a back-up Faraday cage 55, which may be separate from main Faraday cage 50. In embodiments, all or part of the administrative portal may be duplicated and/or backed up. A duplicate administrative portal or portion thereof may be located in a separate geographic area. A duplicate portal may serve as a disaster recovery operations portal.

In embodiments, a digital math-based asset miner, such as a BITCOIN miner, may be located at or within the administrative portal. The miner may be one or more computers. In embodiments, the miner may be operationally connected to any of the computers and/or devices at the administrative portal described above.

Figure 29D:
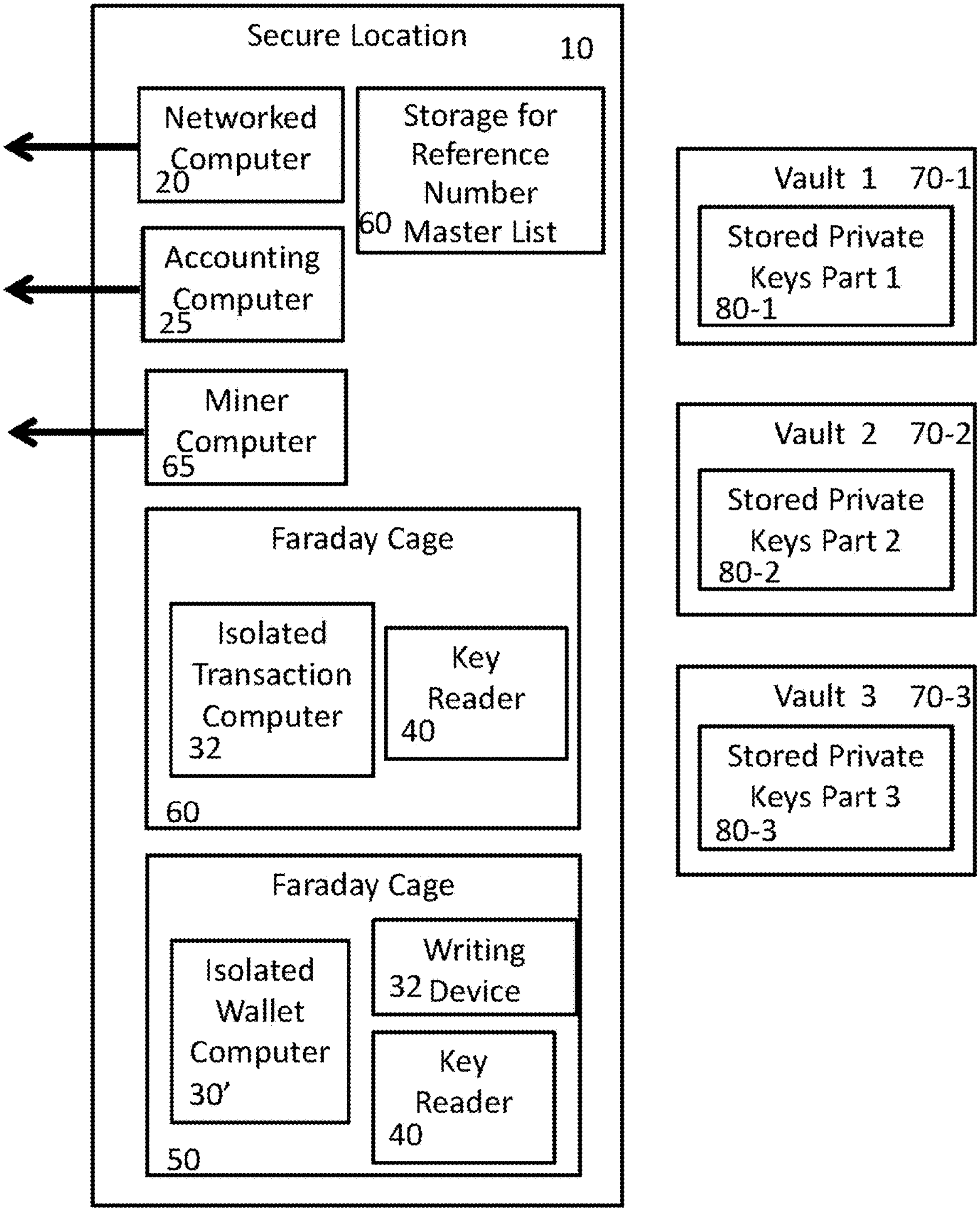

In embodiments, referring to FIG. 29D, the secure location can house one or more networked computers 20, one or more accounting computers 25, one or more digital asset miner computers 65, one or more isolated transaction computers 32 operatively connected to one or more key readers 40, and one or more isolated wallet computers 30', operatively connected to one or more writing devices 32 and, in embodiments, to one or more key readers 40. Each isolated transaction computer 60 and/or isolated wallet computer 30' may be isolated from each other and/or other computers electronically using a secure environment, such as a Faraday cage 50, 60.

One or more vaults 70, 70-1, 70-2, 70-3, 70-N, may be used to hold assets. Vaults may be any secure storage facilities, structures, and/or systems. For example, a vault may be a bank vault or a safety deposit box. Vaults may have appropriately controlled environments (e.g., regulated temperature and/or humidity, to name a few) to enable long-term storage of keys and/or key segments substrates. Vaults may be operated by one or more entities, which may be separate entities. In embodiments, only bonded employees may be permitted access to the vaults. Also, vaults may be located in one or more physical (e.g., geographic) and/or digital (e.g., residing on one or more separate computer servers or hard drives) locations. In embodiments, vaults may be used in conjunction with digital wallets and/or other devices and/or systems known in the art for storing digital assets and/or data.

In the exemplary embodiments of FIGS. 29A-29D, the private keys 80 may be divided into three segments, 80-1, 80-2, and 80-3 for storage. Each segment may be stored in a separate one of vaults 70-1, 70-2, and 70-3. In embodiments, two segments, four segments, five segments or another number of segments can be used in accordance with embodiments the present invention. In embodiments, each key segment may be stored in a vault operated by the same entity or by one or more different entities.

In embodiments, one or more duplicate copies of each key or key segment may be produced. Such duplicate copies may be stored in separate vaults, e.g., three sets of keys split into three segments may be stored in nine vaults, four sets of keys split into two segments may be stored in eight vaults, and/or the copies of key segments may be distributed among some other number of vaults, to name a few. See, e.g., FIGS. 29A-29D, to name a few. Duplicate copies may serve as a back-up in case one copy of a key or key segment becomes corrupted, lost, or otherwise unreadable.

In embodiments, vaults may hold the keys in an organized or categorized fashion so as to facilitate location of one or more keys or key segments. In embodiments, a sorting reference number may be used to organize the keys or key segments. The sorting reference number may be the same as the reference number that correlates private and public keys. In embodiments, etched coins or other materials or printed keys or key segments may be stacked or otherwise arranged according to the reference number. In embodiments, an index or card catalog may describe the location of the keys. In embodiments, an automated machine may store and retrieve key segments from storage slots, which machine may receive an input to indicate which keys or key segments to retrieve.

Figure 30A:
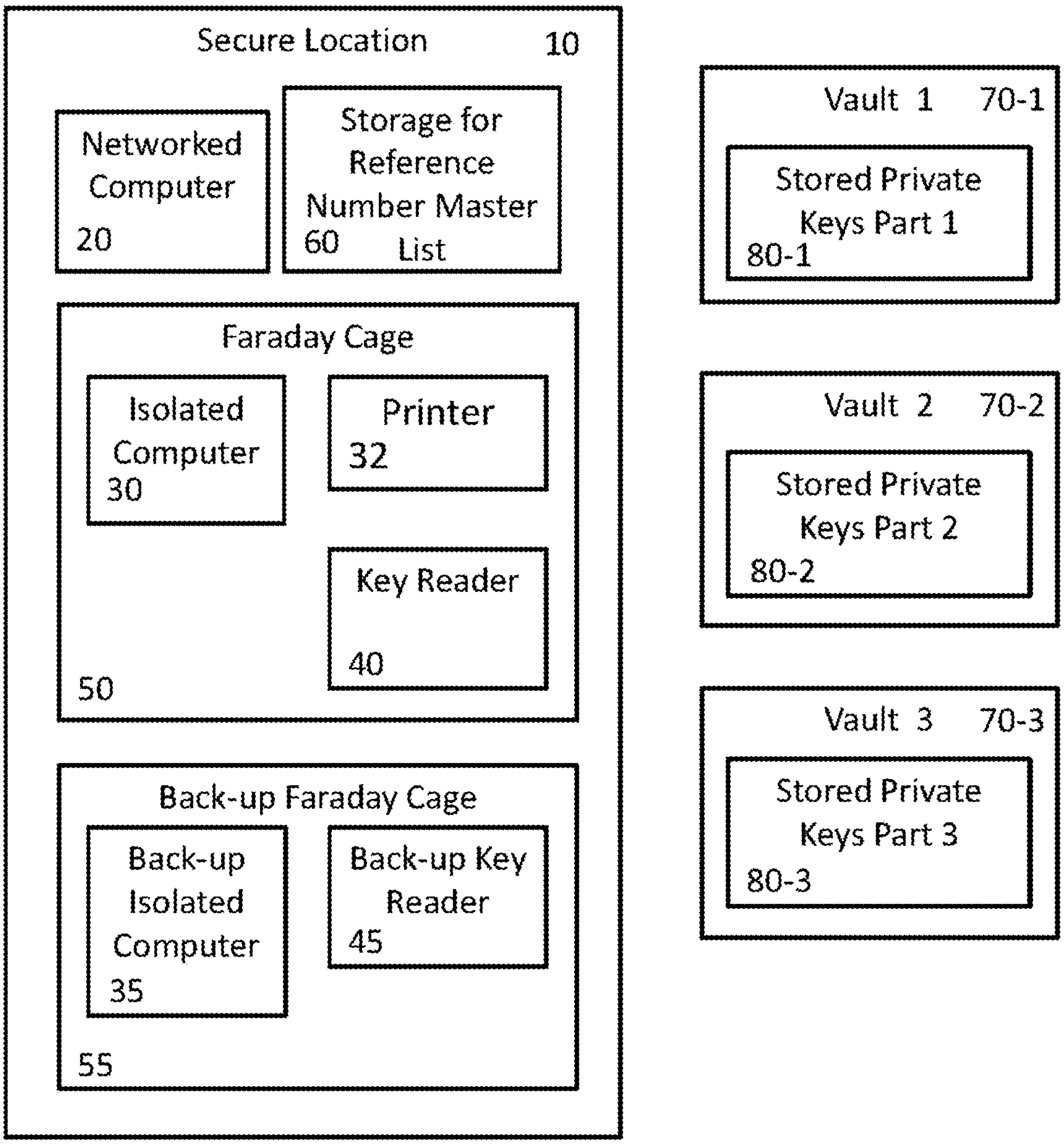
FIGS. 30A-30D are exemplary block diagrams of components of security systems for an exchange holding digital math-based assets in accordance with various exemplary embodiments of the present invention.
Figure 30B:
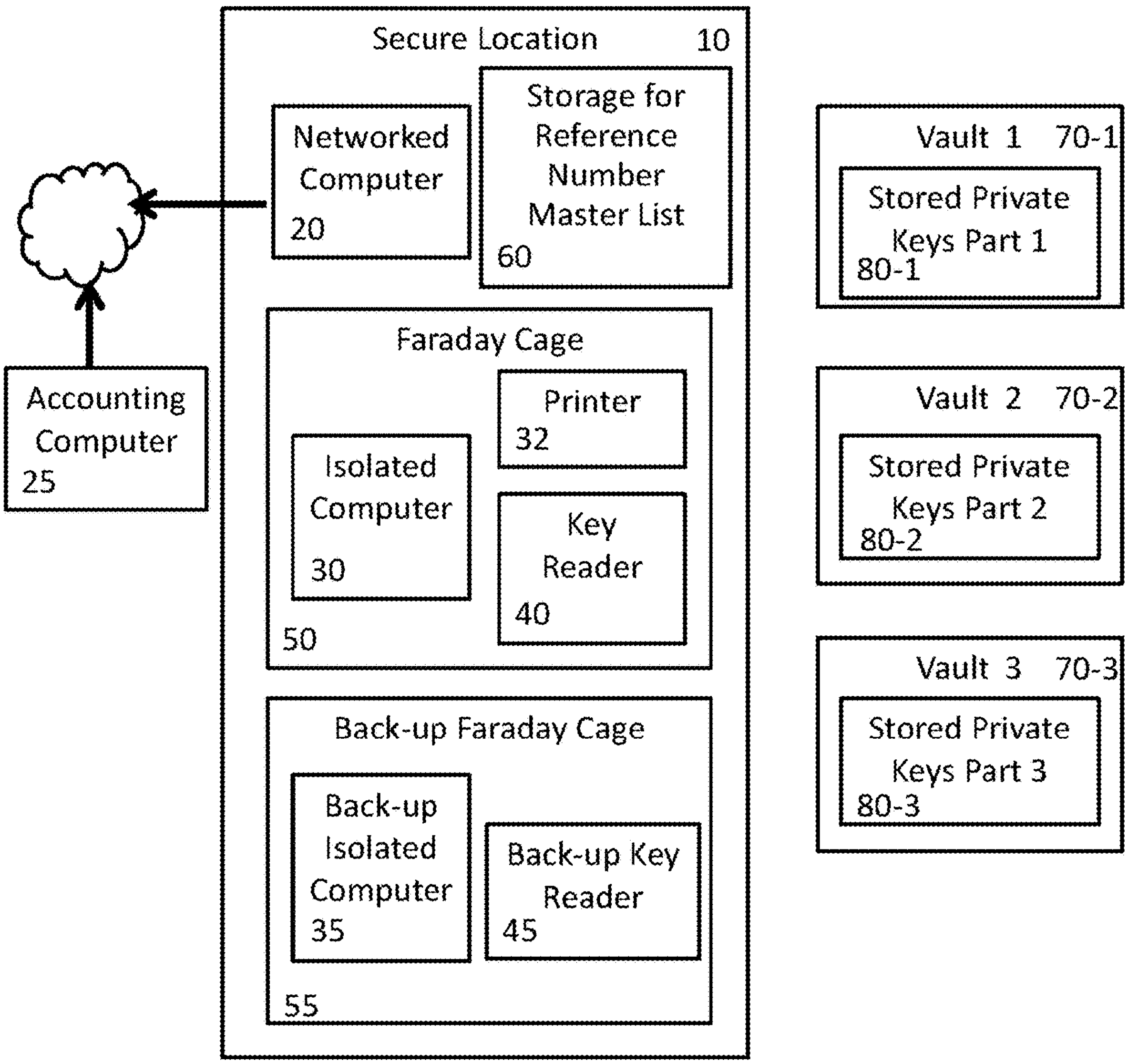
Figure 30C:
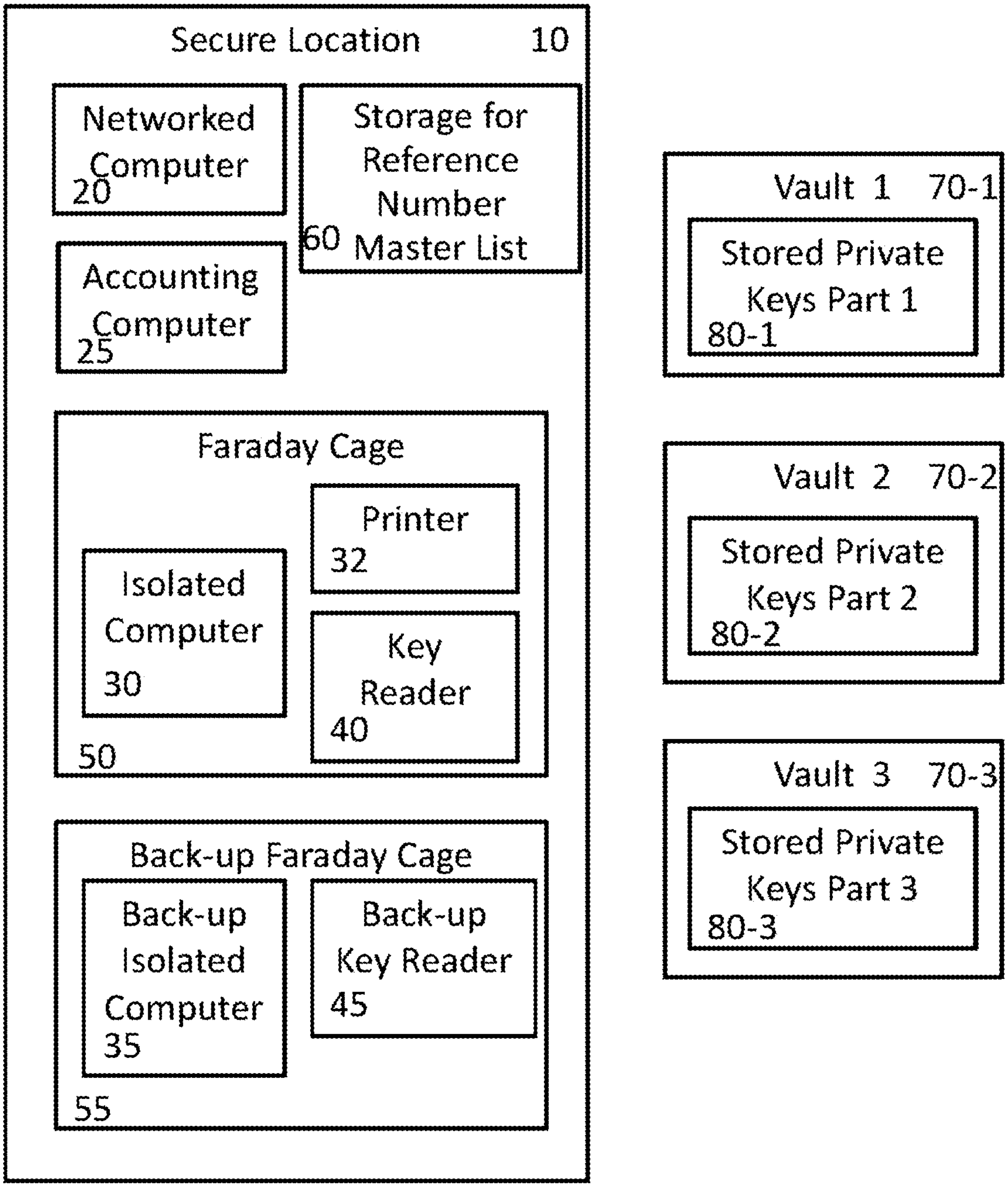
Figure 30D:
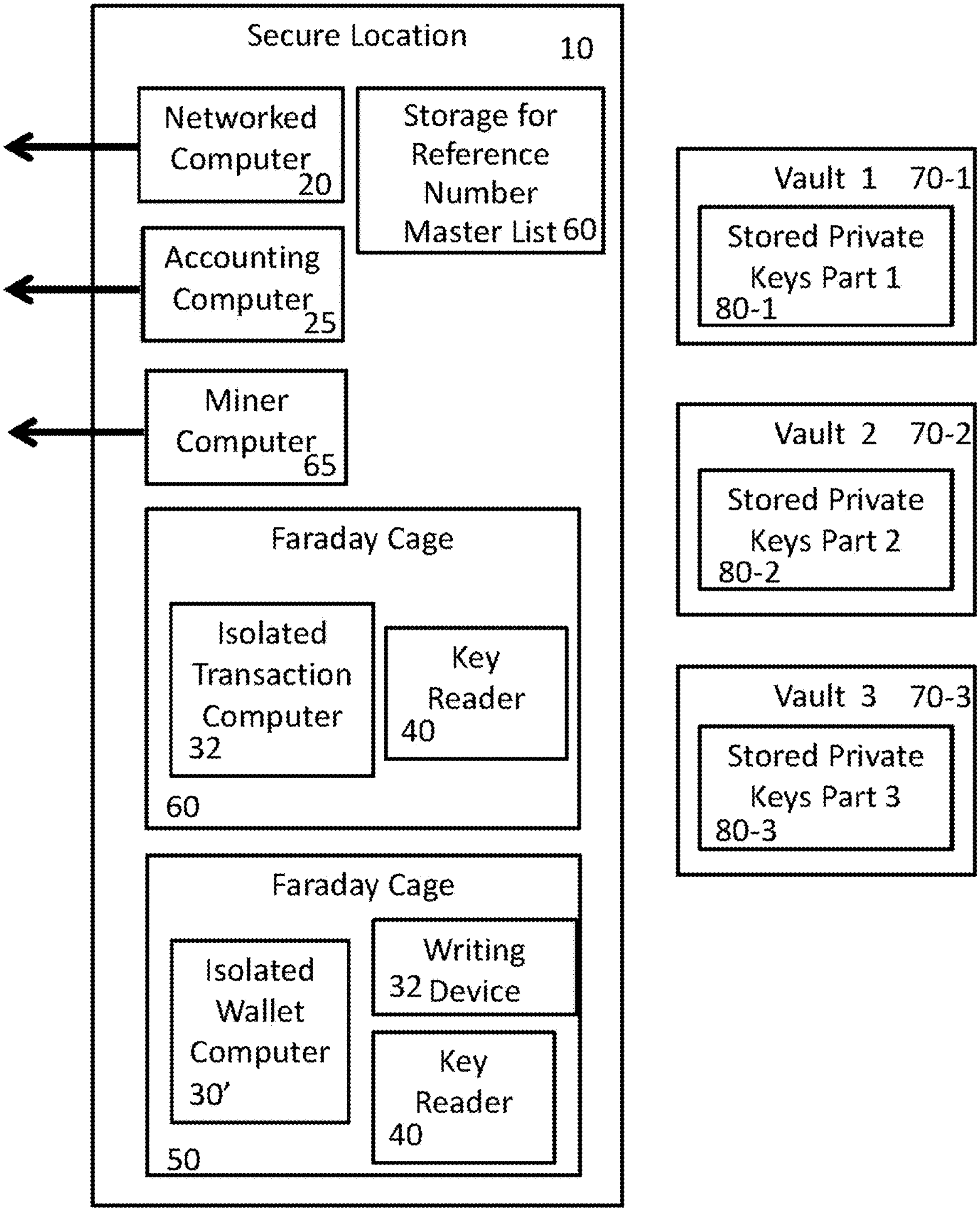

FIGS. 30A-30D illustrate exemplary embodiments of the present invention where one or more computers 25 running accounting software to account for the assets and/or expenses of an account holder can be located either within the secure location 10 (e.g., FIG. 30B) or outside of the secure location 10 (e.g., FIG. 30C). In embodiments, such accounting software as well as possibly other software may be stored, accessed and/or operated on one or more networked computers 20 in the secure location 10. In embodiments, the accounting computer 25 may be the same or different from isolated computer 30 and/or networked computer 20 and/or a mining computer.

Digital Wallets

In embodiments, digital math-based assets can be stored and/or transferred using either a website or software, such as downloaded software. The website and/or downloadable software may comprise and/or provide access to a digital wallet. Each digital wallet can have one or more individual digital asset accounts (e.g., digital asset addresses) associated with it. Each user can have one or more digital wallets to store digital math-based assets, digital cryptocurrency, assets and the like and/or perform transactions involving those currencies or assets. In embodiments, service providers can provide services that are tied to a user's individual account.

Digital wallets and/or the digital asset accounts associated with and/or stored by a digital wallet may be accessed using the private key (which may be used in conjunction with a public key or variant thereof). Accordingly, the generation, access, use, and storage of digital asset accounts is described herein with respect to generation, access, use, and storage of digital wallets. Such descriptions are intended to be representative of digital asset accounts and not exclusive thereof.

A digital wallet can be generated using a digital asset client 110 (e.g., a BITCOIN client). In embodiments, a digital wallet can be created using a key pair system, such as an asymmetric key pair like a public key and a private key. The public key can be shared with others to designate the address of a user's individual account and/or can be used by registries and/or others to track digital math-based asset transactions involving a digital asset account associated with the digital wallet. Such transactions may be listed or otherwise identified by the digital wallet. The public key may be used to designate a recipient of a digital asset transaction. A corresponding private key can be held by the account holder in secret to access the digital wallet and perform transactions. In embodiments, a private key may be a 256-bit number, which can be represented by a 64-character hexadecimal private key and/or a 51-character base-58 private key. As discussed herein, private keys of other lengths and/or based on other numbering systems can be used, depending upon the user's desire to maintain a certain level of security and convenience. Other forms of key pairs, or security measures can be used consistent with embodiments of the present invention.

In embodiments, a digital wallet may store one or more private keys or one or more key pairs which may correspond to one or more digital asset accounts.

In embodiments, a digital wallet may be a computer software wallet, which may be installed on a computer. The user of a computer software wallet may be responsible for performing backups of the wallet, e.g., to protect against loss or destruction, particularly of the private and/or public key. In embodiments, a digital wallet may be a mobile wallet, which may operate on a mobile device (e.g., mobile phone, smart phone, cell phone, iPod Touch, PDA, tablet, portable computer, to name a few). In embodiments, a digital wallet may be a website wallet or a web wallet. A user of a web wallet may not be required to perform backups, as the web wallet may be responsible for storage of digital assets. Different wallet clients may be provided, which may offer different performance and/or features in terms of, e.g., security, backup options, connectivity to banks or digital asset exchanges, user interface, and/or speed, to name a few.

Figure 23:
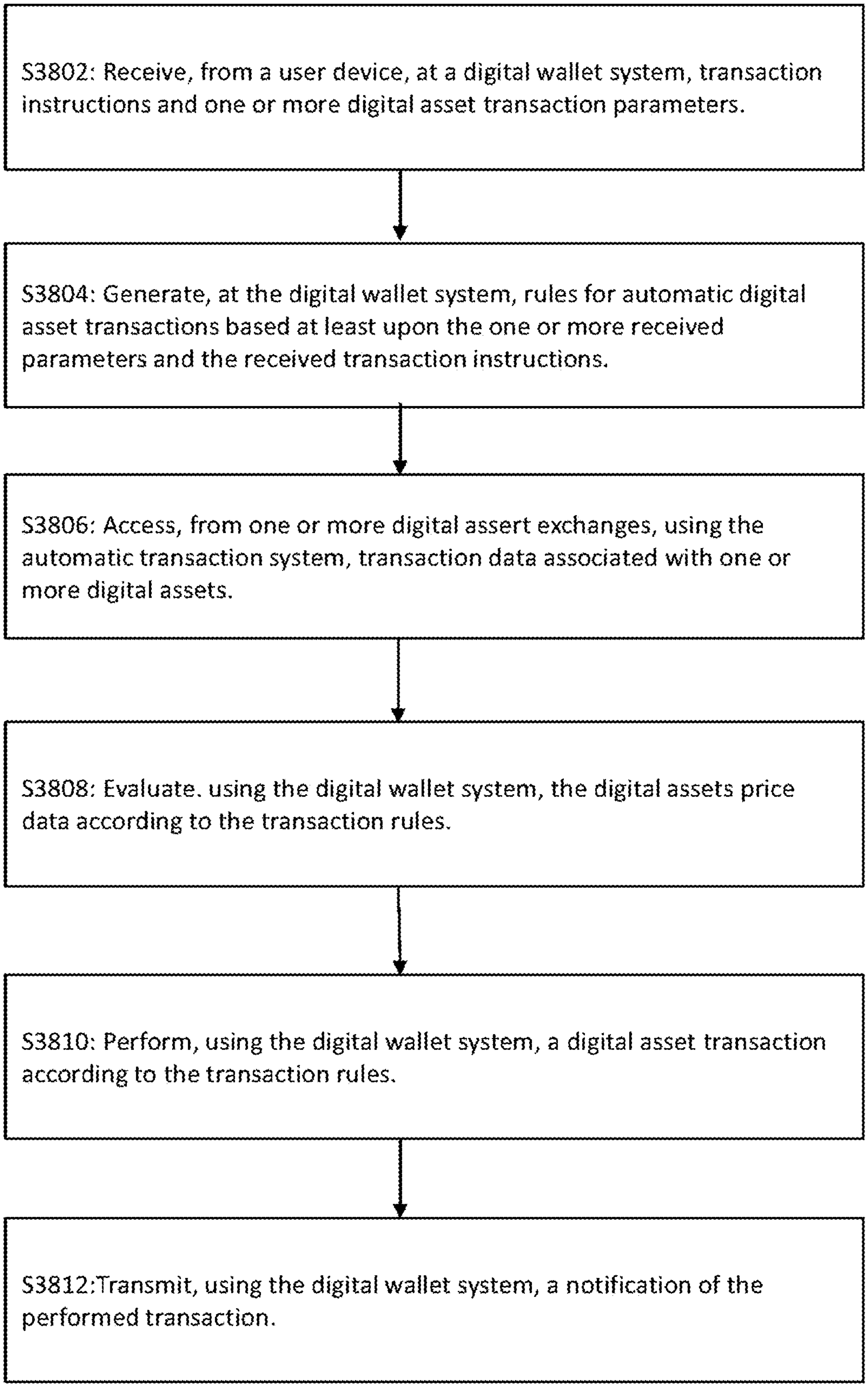
FIG. 23 is an exemplary flow chart for a process for converting from, to or between digital assets in accordance with exemplary embodiments of the present invention.

The digital asset exchange computer system 3230 may be used to convert digital assets into fiat or other digital assets as well as to exchange fiat for digital assets. In embodiments, a digital asset exchange computer system 3230 may include one or more databases that are used to store user account authentication data, fiat account data, digital wallet data, digital asset customer account data and transaction data, including transaction parameters and transaction instructions. A digital wallet system is operatively connected to a decentralized digital asset network that uses a decentralized electronic ledger in the form of a blockchain maintained by a plurality of physically remote computer systems to track at least one of asset ownership or transactions in a digital asset exchange system. The digital wallet system includes one or more digital wallet modules. FIG. 23 illustrates an exemplary process by which the digital exchange computer system including the digital wallet system conducts transactions. The digital wallet system receives, from a user device, transaction instructions and one or more transaction parameters associated with a transaction as indicated in step S3802. In embodiments, the transactions parameters include on or more of (1) a digital asset strike price as a threshold for sale of a specified amount of digital assets when the price equals, rises above or falls below a predefined threshold, wherein the amount of digital assets to transact may be specified in a different denomination; (2) digital asset denominations; (3) digital asset amounts; (4) time periods; (5) rates of change; or (6) absolute amounts of change. The transaction instructions include at least one of the following (1) buy; (2) sell; (3) hold; or (4) convert to a different denomination of digital asset or fiat currency.

In embodiments, the digital wallet system generates transaction rules for automatic digital asset transactions based on at least the one or more received transaction parameters and the received transaction instructions as indicated at step S3804. The transaction rule include computer code running on the one or more computers to perform a transaction when one or more specified conditions are met or not met, based on the rules.

In embodiments, the digital wallet system accesses transaction data including price data associated with the specified amount of digital assets and stores the transaction data in the one or more databases as indicated in step S3806. In an embodiment the digital wallet system may access the transaction data using an application programming interface of an exchange agent. At step S3808, the digital wallet system evaluates the price data according to the transaction rules and, at step S3810, performs automated transactions when pre-defined conditions are met or not met in accordance with the transaction rules and the price data. This evaluation may include testing the transaction data against one or more logical conditions embodied in the transaction rules. In embodiments, these logical conditions include determining at least one of whether the digital asset price has reached or crossed a threshold value; or whether a rate of change in price has reached or crossed a threshold value. The digital wallet system may format the transaction data to be compatible with the digital wallet system.

In embodiments, at step S3812, the digital wallet system may generate one or more notifications to one or more user devices, with the notices includes at least one of a status update on transactions; notification of at least one of incomplete, pending or failed transactions; a log of all transactions as performed by at least one of the digital wallet system or by a user and a log of all transaction opportunities, including transactions declined or not otherwise authorized and transmits the one or more notifications to the user devices.

The digital asset exchange computer system may also include a fund transfer system including a fiat account funding and redemption system, a digital asset account funding and redemption system operatively connected to the digital wallet system and operatively connected to the decentralized digital asset network and a settlement engine operatively connected to the decentralized digital asset network and configured to carry out transactions. The settlement engine may be configured to process specified customer transactions to purchase or sell digital assets according to a user's instructions, if certain user specified factors are met. The user specified factors include that at least one of digital assets are: (a) within a given price, (b) quantity, or (c) period of time. In embodiments, the settlement engine may perform steps of holding, by the digital asset exchange computer system, funds in escrow until a buyer's payment of fiat is received into a bank account; receiving, by the digital asset exchange computer system from a digital asset buyer device, a notification of received digital assets from a digital asset seller; and providing, by the digital asset exchange computer system to a bank computer system associated with a digital asset exchange bank, an instruction to release the digital asset buyer's funds to the digital asset seller. The settlement engine may include pre-program instructions to transfer an amount of digital assets from a seller wallet to at least one buyer wallet upon the occurrence of user specified conditions.

In embodiments, the transaction may be at least one of formation, buying and selling of derivative products, including call options and put options. In embodiments, the transaction may be at least one or more of digital asset lending, delayed settlements, derivative swaps, futures and forwards, to name a few.

In embodiments, the digital asset account funding and redemption system is configured to process funding of a digital asset account held by the exchange from an exchange customer by receiving, by the digital asset exchange computer system, an initial transfer of digital assets; receiving, by the digital asset exchange computer system, a confirmation of clearance of the digital asset transfer; and updating, by the digital asset exchange computer system, an existing customer account in the one more or more databases with the received digital assets including making an electronic entry in an exchange digital asset electronic ledger and providing a notification that digital assets are received.

In embodiments, the digital asset account funding and redemption system is configured to process withdrawing a digital asset account held by the exchange from an exchange customer. For example, the digital asset account funding and redemption system may provide a withdrawal interface to a first customer user device associated with a first customer, receive user first withdrawal data including at least a first destination wallet address and a first request digital wallet asset withdrawal amount value from the first customer user device, verify that the first digital asset account associated with the first customer contains sufficient digital assets to cover the requested withdrawal amount by reading a digital asset electronic ledger to determine a first digital asset account balance; update the exchange digital asset electronic ledger to reflect the first withdrawal data as pending, execute a first withdrawal based on the first withdrawal data by broadcasting the first withdrawal to a digital asset network electronic ledger, monitor the network digital asset ledger to determine that a transaction based on the first withdrawal is confirmed and update the digital asset ledger to reflect confirmation of the first withdrawal. In embodiments, the digital wallet system may request authority from a user to proceed with the automated transactions before executing the automated transactions. In embodiments, the digital wallet system may require receipt of a user's authorization before performing a transaction by at least one of telephone dialing a number and entering specified digits, text message, email, or via a computer application or a user's mobile wallet. In embodiments, the digital wallet system will automatically perform the transaction if no response is received within a predetermined amount of time set by a user in advance or by default.

The digital asset exchange computer system may also include a fraud analysis system configured to detect fraudulent and/or unauthorized transactions.

In embodiments, the digital math-based asset is BITCOIN. In embodiments, the digital math-based asset is based on a mathematical protocol for proof of work. The mathematical protocol may be open source. In embodiments, the mathematical protocol includes a one-way cryptographic algorithm. In embodiments, the mathematical protocol includes a sequential hard memory function. The digital math-based asset may be based on a mathematical protocol for proof of stake and is open source. In embodiments, the digital math-based asset is based on a cryptographic mathematical protocol. The digital math-based asset may be based on a mathematical protocol for a hybrid of proof of work and proof of stake. The digital math-based asset may be based on a mathematical protocol for proof of stake velocity. The mathematical protocol may rely upon ownership of respective digital math-based asset as a function of duration of ownership. The digital math-based asset may be based on a mathematical protocol for proof of burn.

In embodiments, a number of digital math-based assets in the decentralized digital assert network is limited. In embodiments, a number of digital math-based assets in the decentralized digital assert network is not limited. A specified number of digital math-based assets in the decentralized digital asset network may be added into circulation during a defined time period.

In embodiments, the digital wallet is activated by a private key, which is mathematically related to a public address in a one-way function. In embodiments, the digital wallet includes a multi-signature account which requires a plurality of private keys to access the digital assets held by the multi-signature account. In embodiments, more keys are generated for the multi-signature account than are required to access and/or use an account.

In embodiments, an accounting computer 25 may be a hardware security module, which may comprise hardware (e.g., one or more processors, computer-readable memory, communications portals, and/or input devices, to name a few) and/or software (e.g., software code designed to verify transactions, flag potentially erroneous transactions, and/or stop potentially erroneous or unauthorized transactions). Such a device may verify spending transactions before the transactions are executed. A hardware security module may flag transactions for review (e.g., by portal administrators), before the transactions may be confirmed. A hardware security module may be an offline device, which may be given a daily account activity log (e.g., a log of exchange withdrawals, deposits, exchange transactions (e.g., purchases and sales), purchase order receipts, and/or sell order receipts, to name a few) to determine whether proposed transactions, particularly spending transactions, are valid. A protocol for identifying owners of a digital wallet may be used to verify that spending transactions will deliver the correct amount of assets to the correct address. In embodiments, a quorum of a specified size may be required to override a hardware security module. In embodiments, a transaction may be processed using both an isolated and a networked computer, as discussed herein. Such a transaction may be performed using an air-gapped digital wallet, such as described in the context of FIG. 36D, and isolated wallet computer 30' within faraday cage 50 or the isolated transaction computer 32 in faraday cage 60 which are air gapped from network computer 20. In embodiments, an unsigned transaction may be performed on a networked computer, which may only contain one or more wallets capable of watching transactions and/or performing unsigned transactions. A non-networked, isolated computer may contain one or more complete wallets, which may be used to sign transactions. The transaction may be transferred to the isolated computer for signing. Hence, an air gap or other lack of a required communication connection may exist between the isolated and networked computer. In embodiments, the unsigned transaction data may be transferred manually, such as by saving the data from the networked computer to a removable storage medium (e.g., a USB flash drive, CD, CD-ROM, DVD, removable hard drive, disk, memory card, to name a few), and inputting or otherwise operatively connecting the storage medium to the isolated computer. The isolated computer may then access and sign the transaction data. The signed transaction data may then be transferred back to the networked computer using the same or different method of transfer as used for the unsigned transaction data. The networked computer may then access and upload, distribute, or otherwise act on the signed transaction data to complete the transaction. In embodiments, the isolated computer may generate and sign (e.g., with a private key) transaction instructions, which may then be transferred to the networked computer for distribution to the digital asset network. In embodiments, the networked computer and the isolated computer may be operatively connected, e.g., using a wired connection (e.g., a USB cable, Ethernet cable, Laplink cable, to name a few) or using a wireless connection (e.g., Bluetooth, Wi-Fi, infrared, radio, to name a few). Such operative connection may replace the manual transfer of transaction data between the computers, and in embodiments, security measures, such as firewalls or automated separable physical connector devices (e.g., controlled from the isolated computer), may be employed to protect against unauthorized access, particularly to the isolated computer. "Air gap, air wall or air gapping" is a network security measure employed on one or more computers to ensure that a secure computer network is physically isolated from unsecured networks, such as the public Internet or an unsecured local area network. The name arises from the technique of creating a network that is physically separated (with a conceptual air gap) from all other networks. To prevent unauthorized data extrusion through electromagnetic or electronic exploits, there is often a specified amount of space between the air gapped system and outside walls and between its wires and the wires for other technical equipment. For a system with extremely sensitive data (such as a private key of a digital asset account), as explained previously, a Faraday cage can be used to prevent electromagnetic radiation (EMR) escaping from the air-gapped equipment.

Figure 32A:
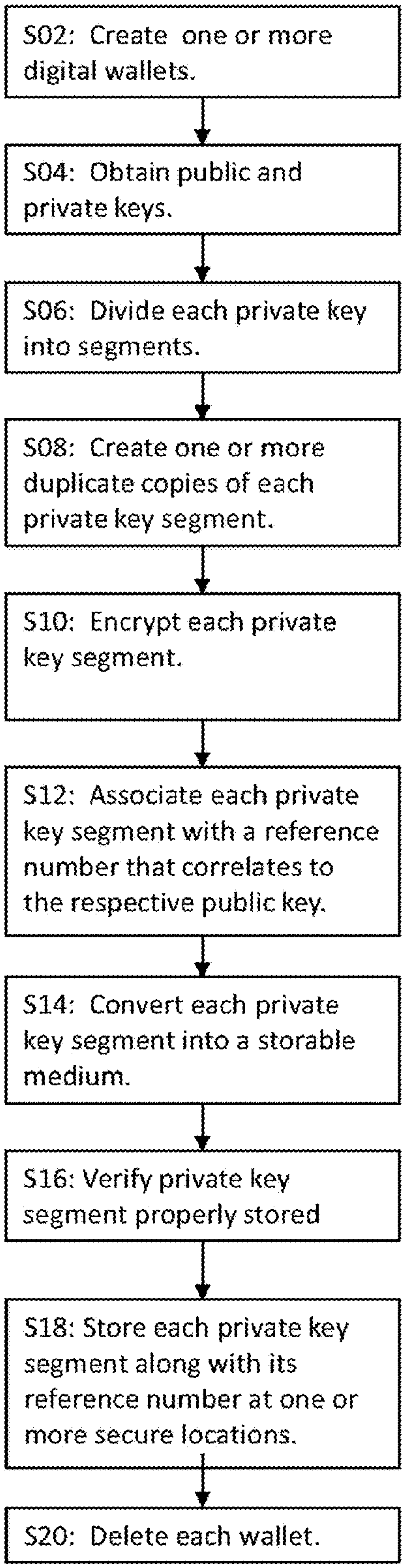
FIGS. 32A-32B are flow charts of exemplary processes for creating and securing digital wallets in accordance with exemplary embodiments of the present invention.
Figure 32B:
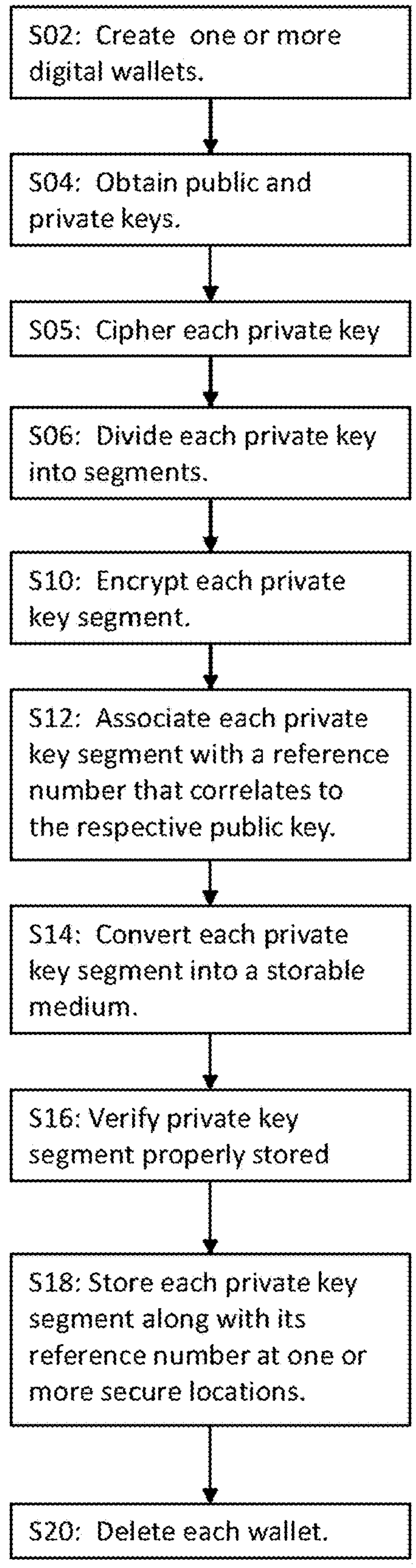

FIG. 32A illustrates an exemplary embodiment of a process for creating digital wallets and storing their keys. In step S02 one or more digital wallets may be created using one or more isolated wallet computers 30'. In step S04, the public and private keys associated with the created digital wallets may be obtained using one or more isolated wallet computers 30'. In embodiments, referring to FIG. 32B, in step S05 each private key may be ciphered. In step S06, each private key, which may be a ciphered private key following step S05, may be divided into segments. In step S08, one or more duplicate copies of each private key segment may be created. In some embodiments, the private key may be divided into 2, 3, 4 or more segments. In embodiments, each private key segment may be encrypted or otherwise encoded In step S10. In embodiments, steps S08 and/or S10 may be skipped. In step S12, each private key segment may be associated with a reference number, correlating the private key segment to the respective public key and/or indicating the order of the private key segment within the complete key. In step S14, each encrypted private key segment may be converted to a storable medium, such as by printing each private key segment on paper. In step S16, the private key segment as converted in the storable medium (e.g., printed) is verified to confirm it was properly and retrievable stored. In embodiments, this step may be skipped. In step S18, each private key segment is stored along with its reference number at one or more secure locations. In step S20, each digital wallet is deleted, leaving the stored keys as a means to regenerate the wallets.

Figure 33A:
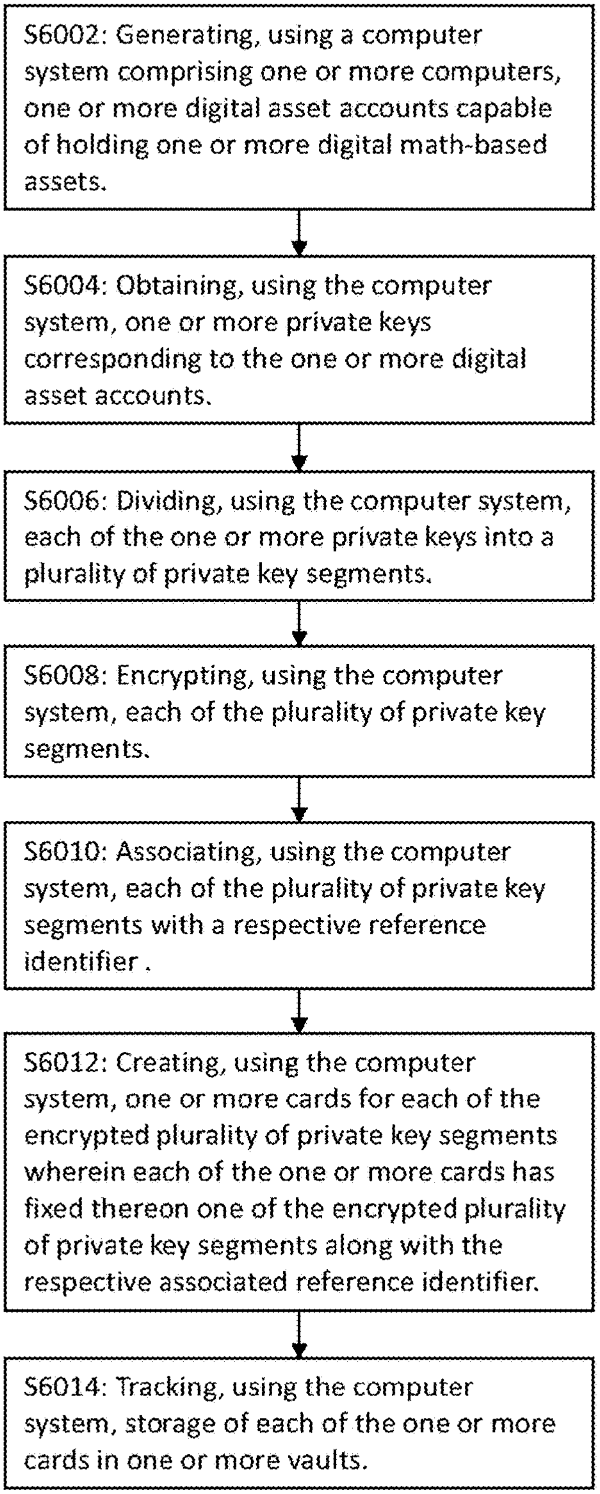
FIGS. 33A-33D are flow charts of exemplary processes for generating digital asset accounts and securely storing the keys corresponding to each account in accordance with exemplary embodiments of the present invention.

FIG. 33A is a flow chart of a process for generating digital asset accounts and securely storing the keys corresponding to each account. In embodiments, the process may be performed using one or more isolated computers not connected to any external data networks. The isolated computer may comprise a clean copy of an operating system (e.g., a clean boot) stored in computer-readable memory and running on one or more processors.

In step S6002, a computer system comprising one or more computers may be used to generate one or more digital asset accounts capable of holding one or more digital math-based assets. In embodiments, such accounts may be associated with digital asset ownership and/or possession without physically holding a digital asset in any location. A digital asset software client, which may comprise part of a digital wallet or may be accessed using a digital wallet, may be used to generate the digital asset accounts.

In step S6004, the computer system may be used to obtain one or more private keys corresponding to the one or more digital asset accounts. In embodiments, the private keys may be generated as part of the digital asset account creation process.

In step S6006, the computer system may be used to divide each of the one or more private keys into a plurality of private key segments. In embodiments, such as with a multi-signature wallet, at least one private key for each digital asset account may be divided into private key segments.

In step S6008, the one or more computers may be used to encrypt each of the plurality of private key segments. Encryption can comprise any of the techniques described herein, such as character substitution, scrambling, mapping, and/or hashing, to name a few. The computer system can apply one or more algorithms to perform the encryption. Symmetric and or asymmetric encryption algorithms may be applied.

In step S6010, the one or more computers may be used to generate and/or associate each of the plurality of private key segments with a respective reference identifier. A reference identifier may be a number, alphanumeric sequence, or other unique sequence that can be used to identify key segments, which may be used for storage and/or retrieval of key segments. The reference identifier for each key segment may be stored on a reference identifier master list, which may be stored electronically and/or on a physical substrate. The reference identifier master list may associate with each other the reference identifiers for key segments corresponding to the same key, and/or may also associate a digital asset account identifier (e.g., a public key or public address) with the key segments.

In step S6012, the one or more computers may be used to create one or more cards for each of the encrypted plurality of private key segments. Each card may have fixed thereon one of the encrypted plurality of private key segments along with the respective associated reference identifier. The cards may be paper, such as index cards, 8½ in.×11 in. sheets of paper, or other paper products. In other embodiments, the cards may include plastic or metal. The cards may be laminated. A writing device may fix the key segments and reference identifiers to the cards by techniques such as printing, etching, and/or magnetically encoding, to name a few. A scannable code, such as a bar code or QR code, may be used to write the keys to the cards.

In embodiments, collated sets of cards may be produced for a plurality of digital asset accounts. Each set may contain only one card per private key such that the private key segments for a single private key are divided among different sets of cards.

In embodiments, following creation of the one or more cards, quality control steps can be performed. A reading device may be used to read each of the cards to ensure readability.

In step S6014, the one or more computers may be used to track storage of each of the one or more cards in one or more vaults. Vaults may be geographically remote. Vaults can include bank vaults and/or precious metal vaults. In embodiments, a main set of vaults and one or more sets of backup vaults may be used. A main set of vaults can be located in a geographically proximate area, such as a metropolitan area of a city, while backup sets of vaults may be located in geographically remote areas. The backup vaults may contain duplicate copies of the cards. Vault locations for each card or set of cards may be included on the reference identifier master list.

In embodiments, the process can further include receiving at the computer system a quantity of digital math-based assets, and storing those digital assets in the one or more securely stored digital asset accounts. In embodiments, storing the digital asset can comprise transferring the digital assets into accounts with securely stored private keys. Accordingly, storing can comprise generating electronic transfer instructions for an electronic transfer of the quantity of digital math-based assets to the one or more digital asset accounts and broadcasting the electronic transfer instructions to a decentralized electronic ledger maintained by a plurality of physically remote computer systems.

Figure 33B:
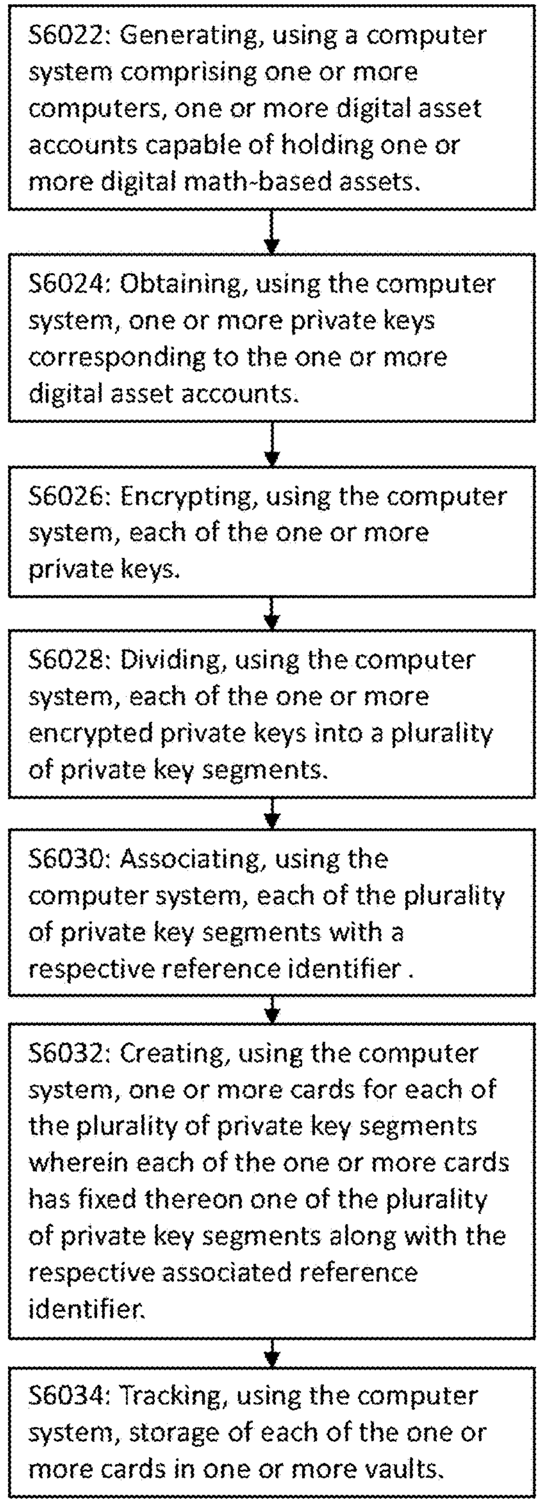

FIG. 33B is a flow chart of another exemplary process for generating digital asset accounts and securely storing the keys corresponding to each account.

In step S6022, a computer system comprising one or more computers may be used to generate one or more digital asset accounts capable of holding one or more digital math-based assets, as described with respect to step S6002 of FIG. 6A.

In step S6024, the computer system may be used to obtain one or more private keys corresponding to the one or more digital asset accounts, as described with respect to step S6004 of FIG. 6A.

In step S6026, the computer system may be used to encrypt each of the one or more private keys.

After encryption, in step S6028, the computer system may be used to divide each of the encrypted private keys into a plurality of key segments.

In step S6030, the one or more computers may be used to generate and/or associate each of the plurality of private key segments with a respective reference identifier.

In step S6032, the one or more computers may be used to create one or more cards for each of the plurality of private key segments.

In step S6034, the one or more computers may be used to track storage of each of the one or more cards in one or more vaults.

Figure 33C:
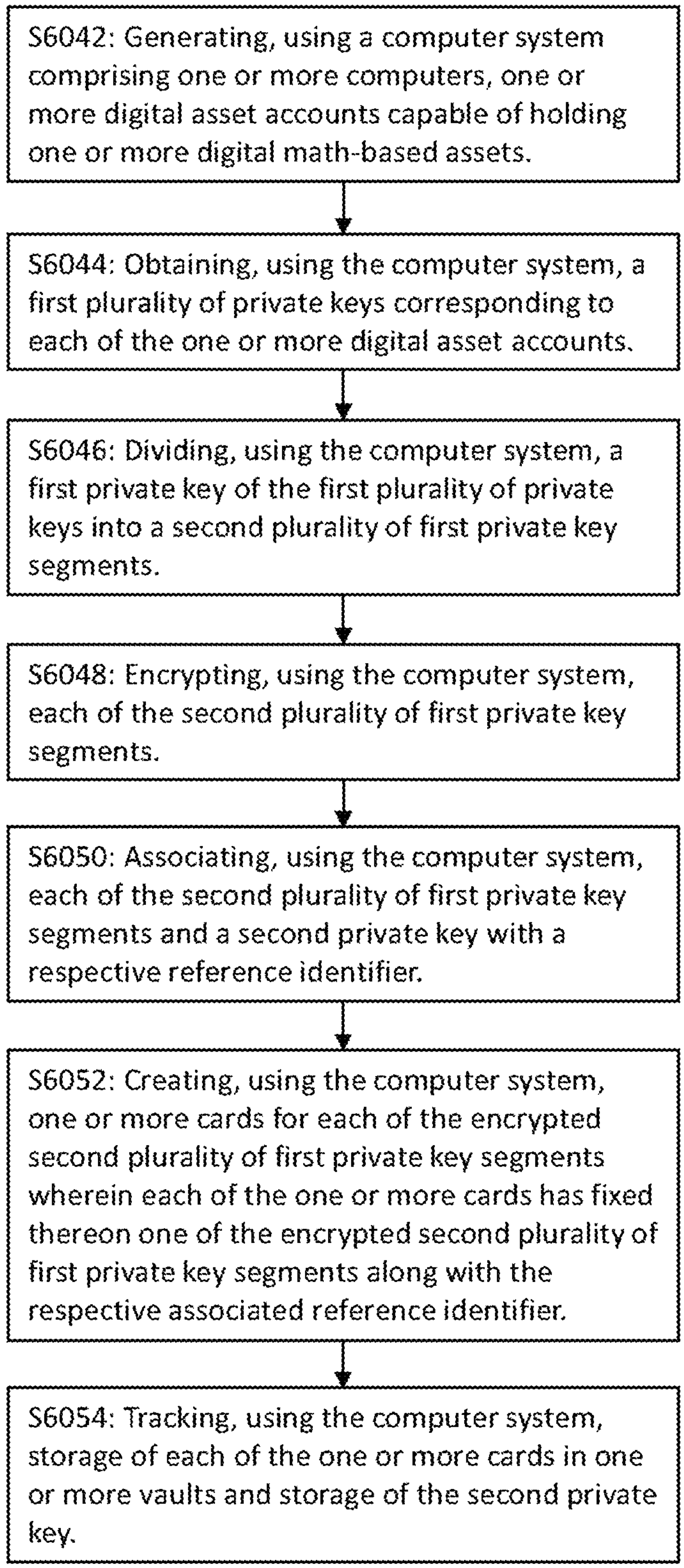

FIG. 33C is a flow chart of another exemplary process for generating digital asset accounts and securely storing the keys corresponding to each account. The exemplary process may generate and store keys for, a multi-signature digital asset account, where at least one of the private keys is divided into a plurality of key segments.

In step S6042, a computer system comprising one or more computers may be used to generate one or more digital asset accounts capable of holding one or more digital math-based assets.

In step S6044, the computer system may be used to obtain a first plurality of private keys corresponding to each of the one or more digital asset accounts. Each first plurality of private keys can comprise the private keys of a multi-signature account.

In step 6046, the computer system may be used to divide a first private key of the first plurality of private keys into a second plurality of first private key segments. For a multi-signature digital asset account at least one of the private keys may be divided into private key segments.

In step S6048, the computer system may be used to encrypt each of the second plurality of first private key segments. In embodiments, the second key may be encrypted.

In step S6050, the computer system may be used to generate and/or associate each of the second plurality of first private key segments with a respective reference identifier.

In step S6052, the computer system may be used to create one or more cards for each of the encrypted second plurality of first private key segments wherein each of the one or more cards has fixed thereon one of the encrypted second plurality of first private key segments along with the respective associated reference identifier. In embodiments, the second key may be written, e.g., using the writing device, to one or more physical substrates, such as paper, plastic, and/or metal. In other embodiments, the second key may be stored electronically.

In step S6054, the computer system may be used to track storage of each of the cards in one or more vaults, as well as to track storage of the second private key. A reference identifier master list may identify the storage locations of each key and key segment.

Figure 33D:
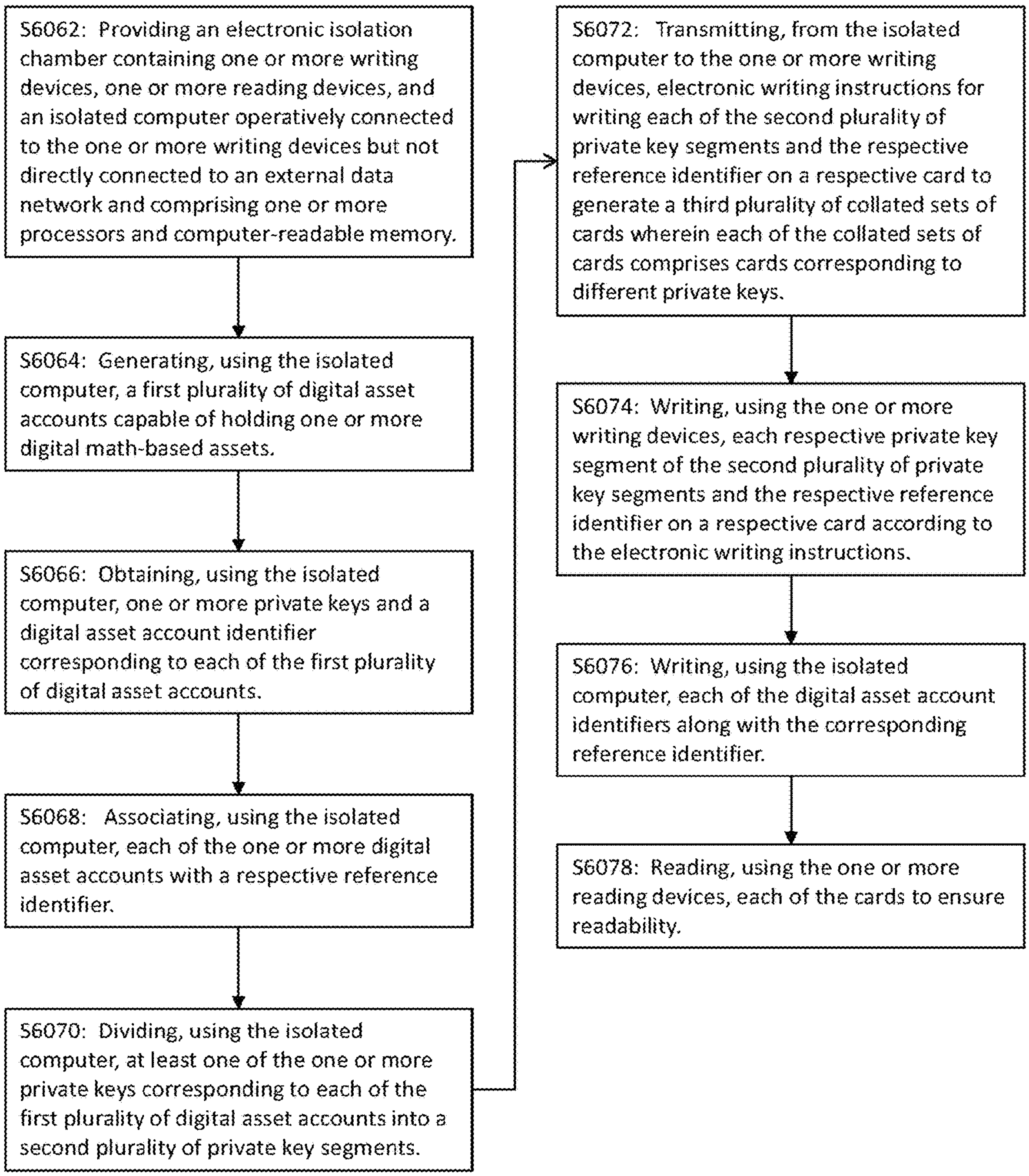

FIG. 33D is a flow chart of an exemplary process for securely generating digital asset accounts and storing associated keys using a secure portal.

In step S6062, an electronic isolation chamber may be provided containing one or more writing devices (e.g., printers, engravers, magnetic card encoders, to name a few), one or more reading devices (e.g., scanners, bar code scanners, QR readers, magnetic card readers, to name a few), and an isolated computer operatively connected to the one or more writing devices but not directly connected to an external data network and comprising one or more processors and computer-readable memory.

In step S6064, the isolated computer may be used to generate a first plurality of digital asset accounts capable of holding one or more digital math-based assets. In embodiments, the first plurality of digital asset accounts may comprise multi-signature digital asset accounts.

In step S6066, the isolated computer may be used to obtain one or more private keys and a digital asset account identifier corresponding to each of the first plurality of digital asset accounts.

In step S6068, the isolated computer may be used to associate each of the one or more digital asset accounts with a respective reference identifier. The reference identifier may comprise an alphanumeric sequence. In embodiments, respective reference identifiers may be associated with one or more keys or key segments corresponding to the respective digital asset accounts.

In step S6070, the isolated computer may be used to divide at least one of the one or more private keys corresponding to each of the first plurality of digital asset accounts into a second plurality of private key segments. In embodiments, each private key segment may be required to regenerate the respective private key. In embodiments, a subset of the second plurality of private key segments (e.g., 3 of 5 keys) could be sufficient to regenerate the respective private key.

In step S6072, the isolated computer may transmit to the one or more writing devices, electronic writing instructions for writing each of the second plurality of private key segments and the respective reference identifier on a respective card to generate a third plurality of collated sets of cards wherein each of the collated sets of cards comprises cards corresponding to different private keys. In embodiments, the third plurality of collated sets can include one or more duplicate sets for each of the collated sets of cards. In embodiments, the isolated computer may be used to generate the electronic writing instructions prior to transmitting them to the one or more writing devices.

In step S6074, the one or more writing devices may be used to write each respective private key segment of the second plurality of private key segments and the respective reference identifier on a respective card according to the electronic writing instructions. In embodiments, step S6074 can comprise printing and/or etching each respective private key segment of the plurality of private key segments and the respective reference identifier on respective separate cards. In embodiments, each respective private key segment of the plurality of private key segments may be magnetically encoded on respective separate cards. The respective reference identifiers may be printed on the respective cards, e.g., to be readable without a magnetic card reader. Each respective private key segment of the second plurality of private key segments may be written, e.g., printed, as a scannable code, such as a bar code and/or a QR code.

In step S6076, the isolated computer may be used to write each of the digital asset account identifiers along with the corresponding reference identifier. In embodiments, step S6076 can further comprise the steps of transmitting, from the isolated computer to the one or more writing devices, second electronic writing instructions for writing each of the digital asset account identifiers along with the corresponding reference identifier, and writing, using the one or more writing devices, each of the digital asset account identifiers along with the corresponding reference identifier according to the second writing instructions. In embodiments, writing according to the second writing instructions can comprise writing to an electronic storage medium, such as a flash drive, hard drive, and/or disc. In embodiments, the electronic storage medium could include a hardware storage module ("HSM"). In embodiments, writing according to the second writing instructions can comprise writing to a physical storage medium, such as paper.

In step S6078, the one or more reading devices may be used to read each of the cards to ensure readability. In embodiments, step S6078 may be performed after step S6076. In embodiments, step S6078 may be performed before step S6076.

In embodiments, the process illustrated by FIG. 33D can further comprise the step of writing, using the isolated computer, the respective digital asset account identifiers to a removable electronic storage medium, e.g., for transfer to an accounting computer.

In embodiments, the process can further comprise the step of destroying the isolated computer, the one or more writing devices, and the one or more reading devices, or destroying any one of those devices.

In embodiments, the method can further comprise the step of encrypting, using the isolated computer, each of the second plurality of private key segments. In embodiments, encryption techniques can include symmetric-key encryption, asymmetric-key encryption, scrambling, substitution, hashing, or adding characters.

In embodiments, the method can further comprise the step of tracking, using the isolated computer, storage of each of the third plurality of collated sets of cards. In embodiments, each of the third plurality of collated sets of cards may be stored in a vault. In embodiments, each collated set of cards may be stored in a separate vault.

FIGS. 29B and 29C illustrate exemplary embodiments of the present invention where one or more computers 25 running accounting software to account for the assets and/or expenses of an account holder can be located either within the secure location 10 (e.g., FIG. 29B) or outside of the secure location 10 (e.g., FIG. 29C). In embodiments, such accounting software as well as possibly other software may be stored, accessed and/or operated on one or more networked computers 20 in the secure location 10. In embodiments, the accounting computer 25 may be the same or different from isolated computer 30 and/or networked computer 20 and/or a mining computer.

In embodiments, an accounting computer 25 may be a hardware security module, which may comprise hardware (e.g., one or more processors, computer-readable memory, communications portals, and/or input devices, to name a few) and/or software (e.g., software code designed to verify transactions, flag potentially erroneous transactions, and/or stop potentially erroneous or unauthorized transactions). Such a device may verify spending transactions before the transactions are executed. A hardware security module may flag transactions for review (e.g., by portal administrators), before the transactions may be confirmed. A hardware security module may be an offline device, which may be given a daily account activity log (e.g., a log of ETP redemptions and/or creations) to determine whether proposed transactions, particularly spending transactions, are valid. A protocol for identifying owners of a digital wallet may be used to verify that spending transactions will deliver the correct amount of assets to the correct address. In embodiments, a quorum of a specified size may be required to override a hardware security module. In embodiments, a transaction may be processed using both an isolated and a networked computer, as discussed herein. Such a transaction may be performed using an air-gapped digital wallet, such as described in the context of FIG. 29D, and isolated wallet computer 30' within faraday cage 50 or the isolated transaction computer 32 in faraday cage 60 which are air gapped from network computer 20. In embodiments, an unsigned transaction may be performed on a networked computer, which may only contain one or more wallets capable of watching transactions and/or performing unsigned transactions. A non-networked, isolated computer may contain one or more complete wallets, which may be used to sign transactions. The transaction may be transferred to the isolated computer for signing. Hence, an air gap or other lack of a required communication connection may exist between the isolated and networked computer. In embodiments, the unsigned transaction data may be transferred manually, such as by saving the data from the networked computer to a removable storage medium (e.g., a USB flash drive, CD, CD-ROM, DVD, removable hard drive, disk, memory card, to name a few), and inputting or otherwise operatively connecting the storage medium to the isolated computer. The isolated computer may then access and sign the transaction data. The signed transaction data may then be transferred back to the networked computer using the same or different method of transfer as used for the unsigned transaction data. The networked computer may then access and upload, distribute, or otherwise act on the signed transaction data to complete the transaction. In embodiments, the isolated computer may generate and sign (e.g., with a private key) transaction instructions, which may then be transferred to the networked computer for distribution to the digital asset network. In embodiments, the networked computer and the isolated computer may be operatively connected, e.g., using a wired connection (e.g., a USB cable, Ethernet cable, Laplink cable, to name a few) or using a wireless connection (e.g., Bluetooth, Wi-Fi, infrared, radio, to name a few). Such operative connection may replace the manual transfer of transaction data between the computers, and in embodiments, security measures, such as firewalls or automated separable physical connector devices (e.g., controlled from the isolated computer), may be employed to protect against unauthorized access, particularly to the isolated computer.

Figure 34:
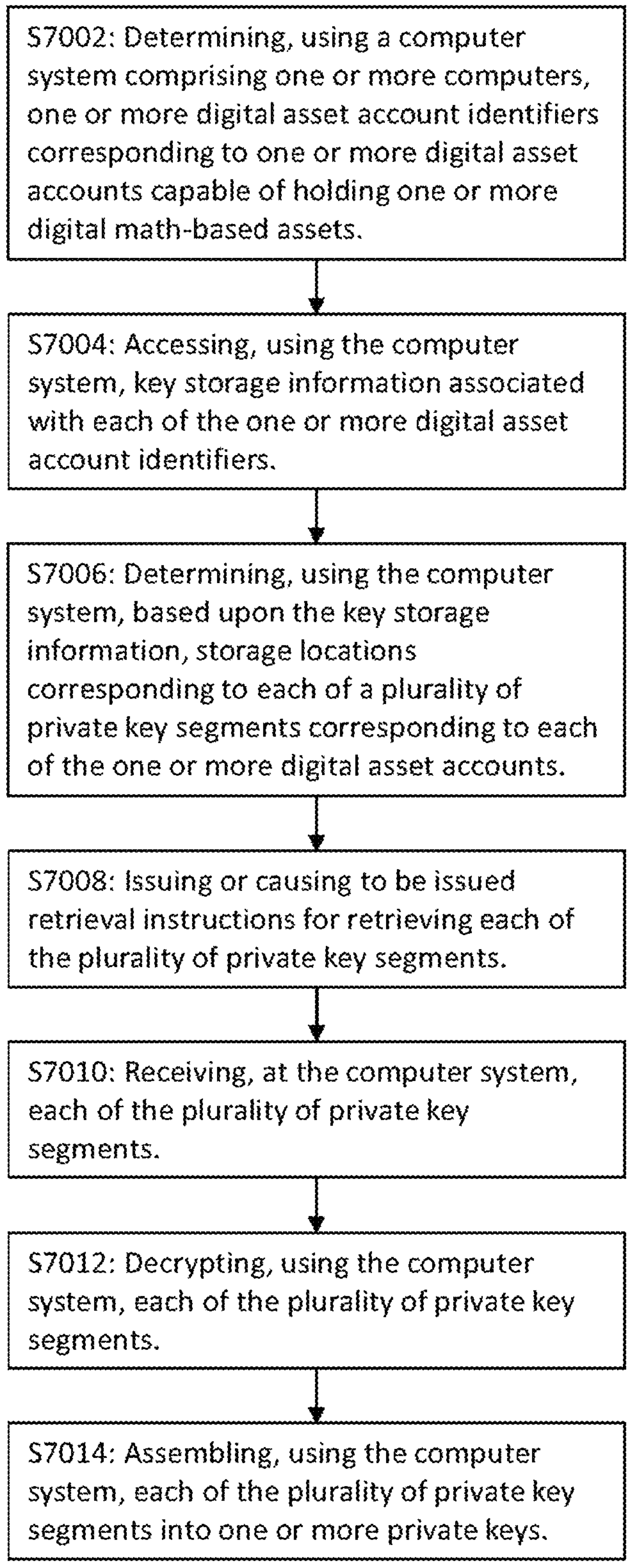
FIG. 34 is a flow chart of an exemplary process for retrieving securely stored keys associated with a digital asset account in accordance with exemplary embodiments of the present invention.

FIG. 34 is a flow chart of a process for retrieving securely stored private keys in accordance with exemplary embodiments of the present invention.

In exemplary embodiments, in step S702, a computer system comprising one or more computers may be used to determine one or more digital asset account identifiers corresponding to one or more digital asset accounts capable of holding one or more digital math-based assets.

In step S704, the computer system may be used to access key storage information associated with each of the one or more digital asset account identifiers. In embodiments, the key storage information may comprise a reference identifier associated with one or more stored private key segments.

In step 706, the computer system may be used to determine, based upon the key storage information, storage locations corresponding to each of a plurality of private key segments corresponding to each of the one or more digital asset accounts.

In step 708, retrieval instructions for retrieving each of the plurality of private key segments may be issued or caused to be issued.

In step 710, each of the plurality of private key segments may be received at the computer system.

In step 712, the computer system may be used to decrypt each of the plurality of private key segments.

In step 714, the computer system may be used to assemble each of the plurality of private key segments into one or more private keys.

In embodiments, the process depicted in FIG. 34 may further comprise the step of accessing, using the computer system, the one or more digital asset accounts associated with the one or more private keys. In further embodiments, the process depicted in FIG. 34 may further comprise the steps of accessing, using an isolated computer of the computer system, wherein the isolated computer is not directly connected to an external data network, the one or more digital asset accounts associated with the one or more private keys; generating, using the isolated computer, transaction instructions comprising one or more transfers from the one or more digital asset accounts; transferring the transaction instructions to a networked computer of the computer system; and broadcasting, using the networked computer, the transaction instructions to a decentralized electronic ledger maintained by a plurality of physically remote computer systems.

Figure 35:
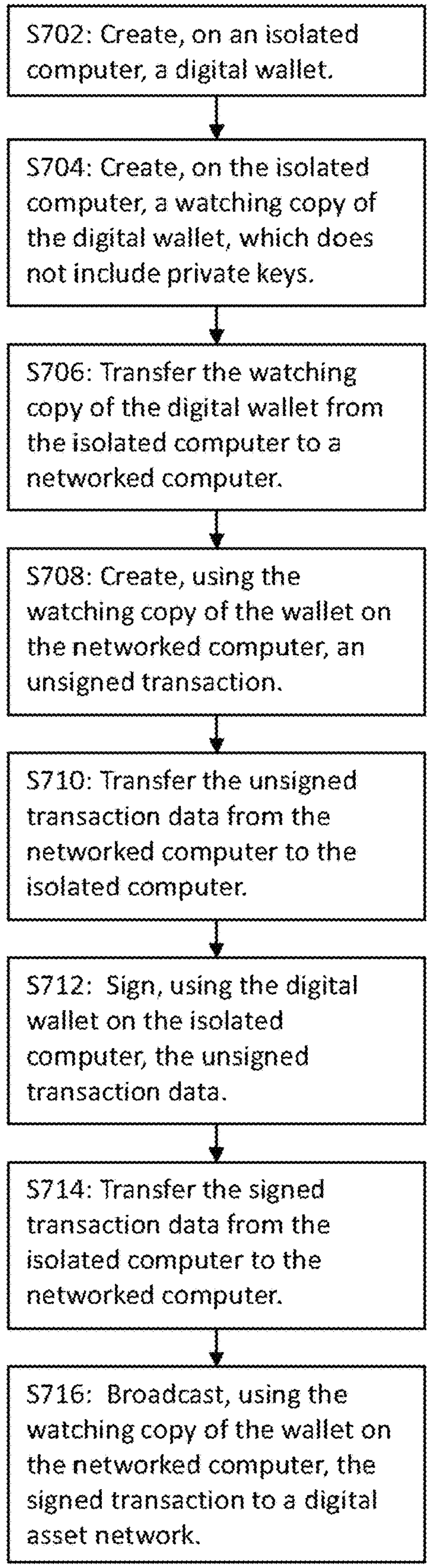
FIG. 35 is a flow chart of a method of performing a secure transaction in accordance with exemplary embodiments of the present invention.

FIG. 35 describes an exemplary method of performing secure transactions. In step S702, a digital wallet may be created on an isolated computer. In step S704, a watching copy of the digital wallet, which may not include any private keys, may be created on the isolated computer. In step S706, the watching copy of the digital wallet may be transferred from the isolated computer to a networked computer. In step S708, an unsigned transaction may be created using the watching copy of the wallet on the networked computer. In step S710, data associated with the unsigned transaction may be transferred from the networked computer to the isolated computer. In step S712, the unsigned transaction data may be signed using the digital wallet on the isolated computer. In step S714, the signed transaction data may be transferred from the isolated computer to the networked computer. In step S716, the signed transaction data may be broadcast, using the watching copy of the wallet on the networked computer, to a digital asset network. In embodiments, the broadcast of a signed transaction may complete a transaction and/or initiate a verification process that may be performed by the network.

In embodiments, processes for generating digital asset accounts and/or storing associated keys may be performed by a secure system, e.g., an administrative portal. The system can comprise an electronic isolation chamber, such as a Faraday cage. The system can further comprise one or more isolated computers within the electronic isolation chamber and comprising one or more processors and computer-readable memory operatively connected to the one or more processors and having stored thereon instructions for carrying out the steps of (i) generating, using the one or more isolated computers, one or more digital asset accounts capable of holding one or more digital math-based assets; (ii) obtaining, using the one or more isolated computers, one or more private keys corresponding to the one or more digital asset accounts; (iii) dividing, using the one or more isolated computers, at least one of the one or more private keys for each digital asset account into a plurality of private key segments, wherein each private key segment will be stored; (iv) associating, using the one or more isolated computers, each of the plurality of private key segments with a respective reference identifier; and (v) transmitting, from the one or more isolated computers to one or more writing devices operatively connected to the one or more isolated computers, electronic writing instructions for writing a plurality of cards, collated into a plurality of sets having only one private key segment per digital asset account, and each card containing one of the plurality of private key segments along with the respective associated reference identifier. The system can further comprise one or more writing devices located within the electronic isolation chamber and configured to perform the electronic writing instructions, including collating the plurality of cards into the plurality of sets. The system can also comprise one or more reading devices located within the electronic isolation chamber and configured to read the plurality of private key segments along with the respective associated reference identifier from the one or more cards. The reading devices may be used for quality control, to ensure that the cards are readable.

Cold Storage

In embodiments, a digital asset account holder may operate one or more computers to manage, process, and/or store the transactions and/or digital assets. In embodiments, a portion, consisting of some or all, of the digital assets may be stored in cold storage, which involves no outside connections. Cold storage may be a bank vault, a precious metal vault, a lockbox, or some other secure room or area. There may be no communication channels connecting to the cold storage area. In embodiments, electronic vaults may be used. Electronic vaults may comprise cloud storage, one or more hard drives, flash drives, memory cards or like storage technology, to name a few. Electronic vaults may hold one or more keys and/or key segments, which may be encrypted and/or encoded as described herein.

In embodiments, the cold storage may comprise a divided storage system. In a divided storage system, components or portions of components may be stored at multiple locations. Components may be at least digital wallets, public and/or private keys, or assets.

Figure 31A:
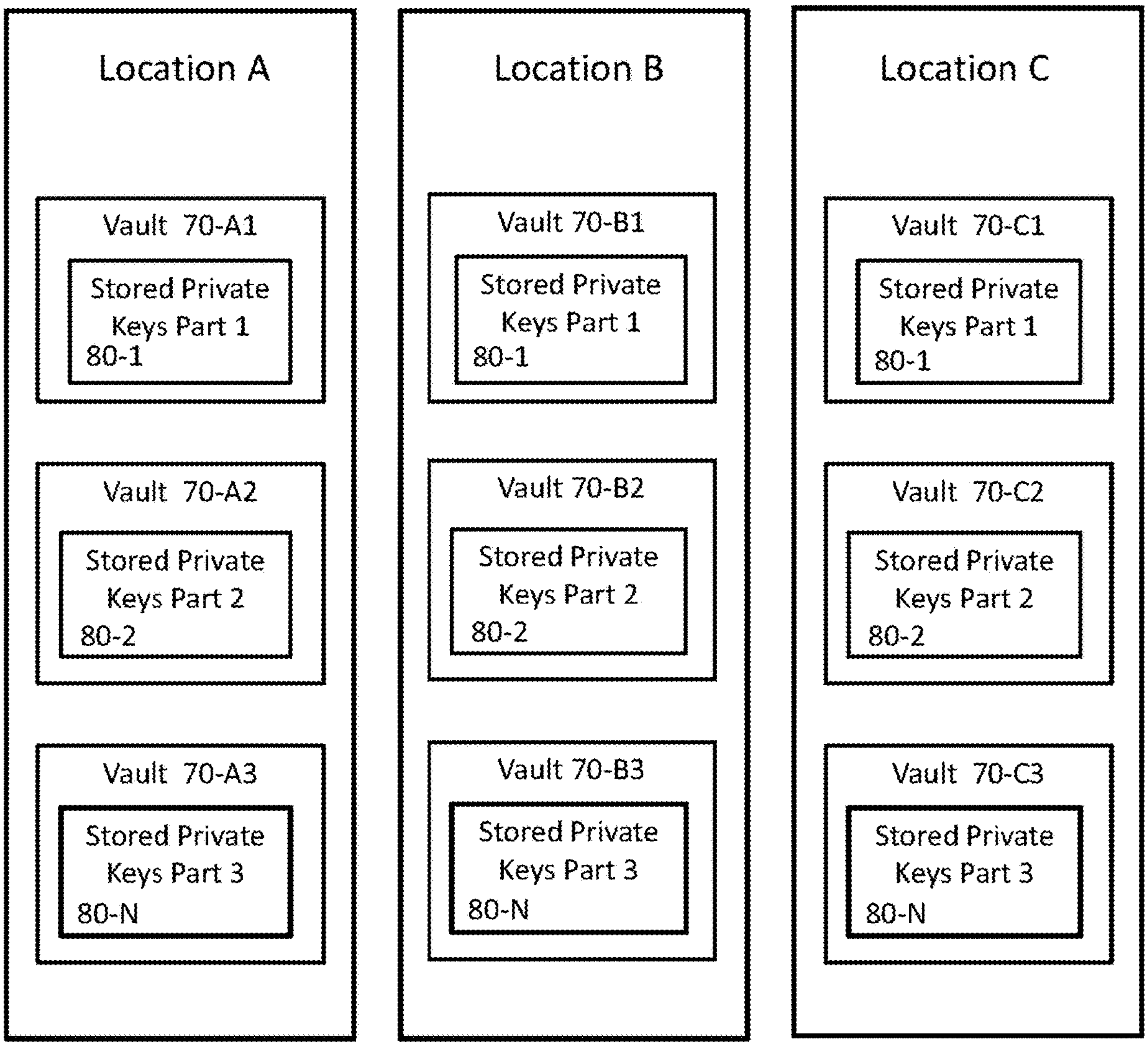
FIGS. 31A-31D are schematic diagrams of cold storage vault systems in accordance with exemplary embodiments of the present invention.

FIG. 31A is a schematic diagram of a cold storage vault system in accordance with exemplary embodiments of the present invention. In embodiments, each private key to be stored in vaults 70 for cold storage may be divided into one or more segments 80. In embodiments, each segment can be stored in a separate vault 70. In this manner, the risk of each of the segments 80 being reassembled into a complete key may be reduced due to the segregation of each piece of each key. Each vault may then be located at different locations, e.g., Locations A, B, and C. In embodiments, each vault (e.g., 70-Aa, 70-A2, 70-A3) may be located at different locations in the same general vicinity (e.g., the general vicinity of Location A, which may be New York City). Each vault may have a user entry log to provide a record of access to the vault and/or may employ security measures to ensure only authorized access.

Duplicate sets of the segmented private keys may then be made and stored in separate vaults (e.g., one duplicate copy divided between Vaults 70-B1, 70-B2, and 70-B3, and another duplicate copy divide between Vaults 70-C1, 70-C2, and 70-C3). Each set of segmented keys 80 may be located in the same general vicinity (e.g., Location B for Vaults 70-B1, 70-B2, and 70-B3 and Location C for Vaults 70-C1, 70-C2, and 70-C3), with each general vicinity being different from other general vicinities (e.g., Location B may be Philadelphia, Pennsylvania and Location C may be Indianapolis, Indiana). Locations may include domestic and/or international locations. Locations can be selected based on at least one or more of the following parameters: ease of access, level of security, diversity of geographic risk, diversity of security/terror risk, diversity of available security measures, location of suitable vaults in existence (e.g., custodian vaults for a trust associated with an ETP), space available at vaults, jurisdictional concerns, to name a few. In embodiments, three geographic locations can be used wherein Location A is within a short intraday time of transit (e.g., 1 hour), Location B is within a longer intraday time of transit (e.g., 3-4 hours), and Location C is within one or more day times of transit (e.g., 1-2 days). In embodiments, the location of the vaults may be within a distance that allows segments of key pairs to be retrieved within a redemption waiting period (e.g., 3 days). A complete key set (e.g., stored private keys parts 1-3) may be stored in each vault general location (e.g., Location A, Location B, Location C).

Figure 31B:
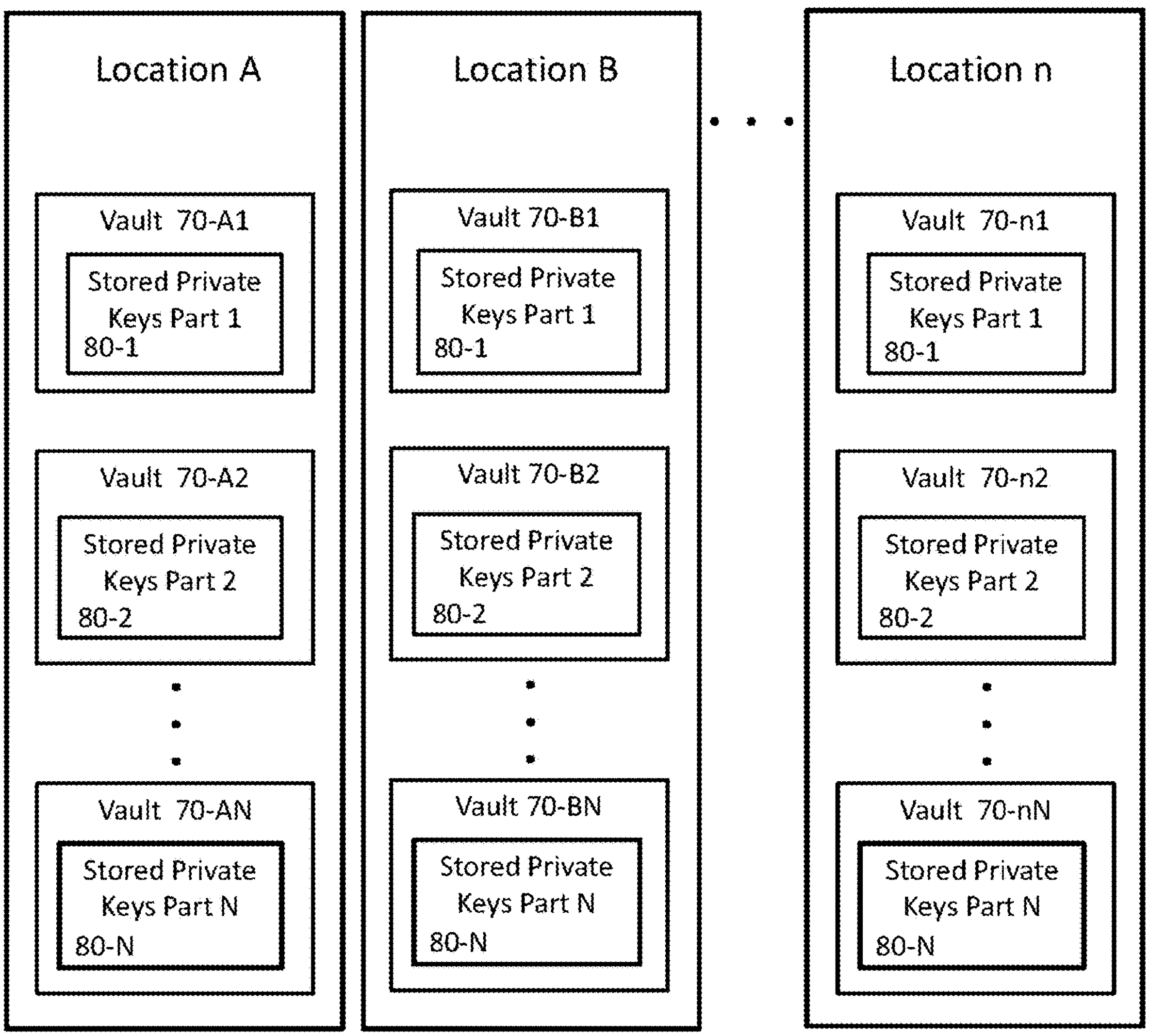

In FIG. 31A, three segments have been used, but other numbers of segments can also be used consistent with embodiments of the present inventions. FIG. 31B illustrates that any number of vault general locations (e.g., A-N) may be used, which may entail N number of complete key sets. In embodiments, the keys may be broken into any number of key segments, 1-N. In embodiments, in order to reassemble one complete key, all N segments may have to be reassembled together.

Figure 31C:
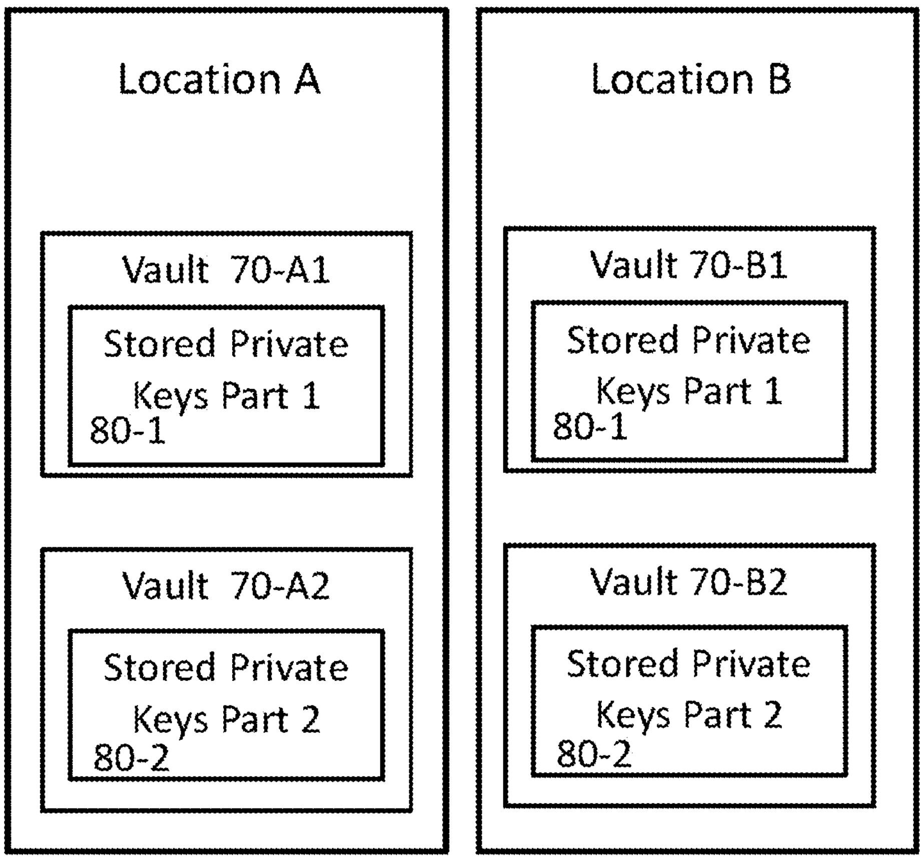

In embodiments, there may be two sets of segmented keys, as illustrated in FIG. 31C, which may be located in two general locations (e.g., A and B). In embodiments, the keys may be parsed into two segments (e.g., 80-1 and 80-2), as illustrated in FIG. 31C.

Figure 31D:
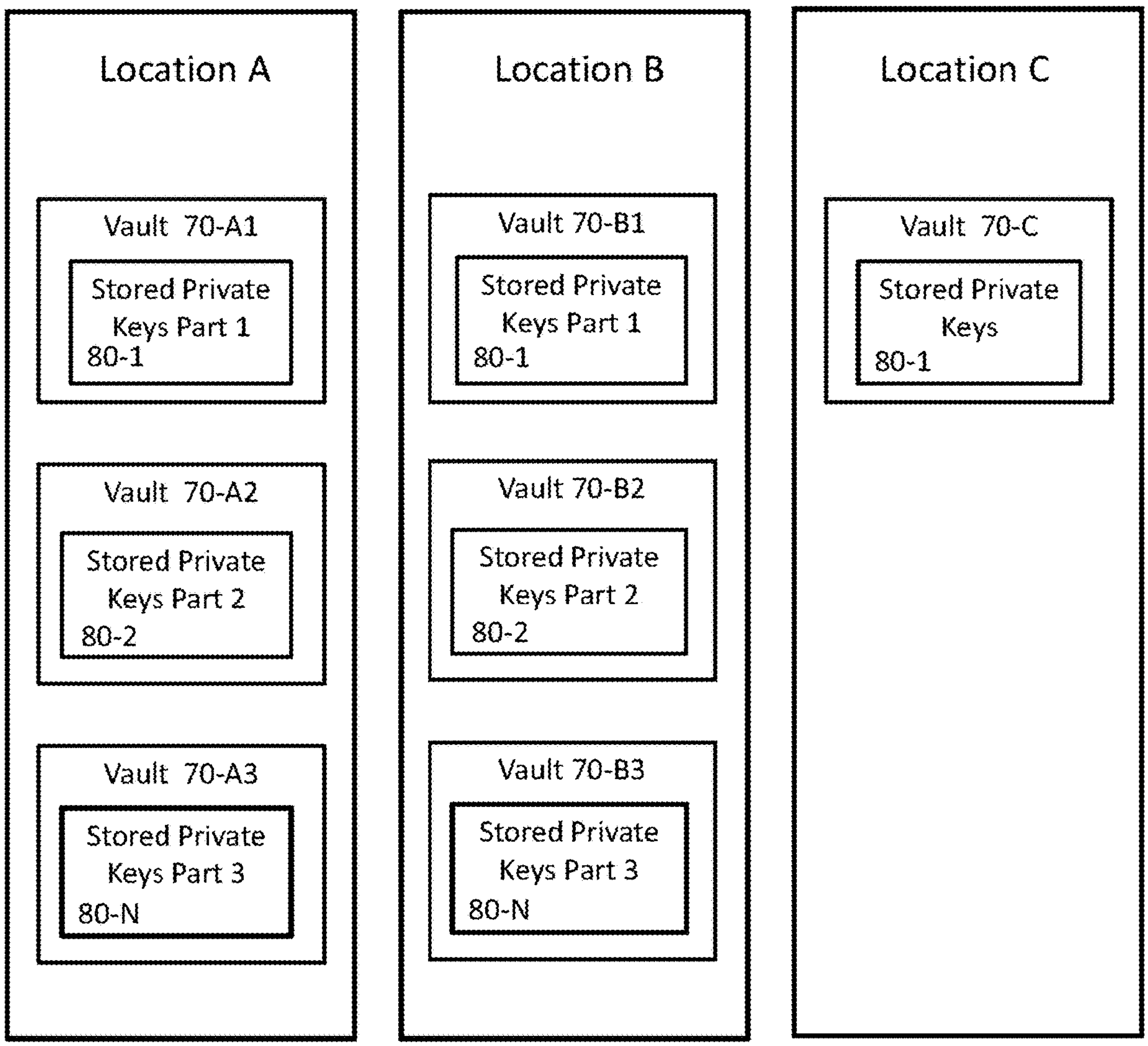

In embodiments, duplicate sets may not be embodied in same form as the original set and/or other duplicate sets. For example, two sets may be stored on paper, and a third set is stored on papyrus. In embodiments, at least one set of segmented keys can be stored on paper, while at least one set is stored on one or more disks, memory sticks, memory cards, tapes, hard drives, or other computer readable media. In embodiments, the same number of segments can be used for each set. In embodiments, a different number of segments can be used for at least two of the sets (e.g., 3 segments for 1 set, and 4 segments for 1 set). In embodiments, different types of coding and/or encryption can be used for at least two sets. FIG. 31D illustrates three sets of key copies, where the third copy 80 stored in vault 70-C may not be divided into segments. Such a key copy may be encrypted like any of the other key segments.

A cold storage back-up may be provided by a one-way electronic data recordation system. The system can function as a write-only ledger. Upon deposit of digital assets into cold storage, the corresponding private keys may be transmitted to the recordation system, which will store a record of the transaction. When digital assets are removed from a wallet, a record of the removal and/or wallet destruction can be sent to the system. In the event that wallet keys must be retrieved, the recordation system can be accessed to determine the wallet keys. Accessing the recordation system to retrieve keys can be designed to be a difficult operation, only to be performed in the event of an emergency need to recover wallet keys.

Key Storage Service

Digital asset storage services and/or digital asset protection may be provided in accordance with the present invention. Digital asset storage may use any of the secure storage systems and methods described herein. In embodiments, a digital asset storage service may be provided to other entities (e.g., a trust, authorized participants in the trust, retailers, banks, or other digital asset users), to provide secure storage of digital assets. Such a storage service may use any of the security measures described herein. In embodiments, a digital asset storage service may comprise, form a part of, and/or be associated with a digital asset insurance system, as described herein.

Digital asset protection can be digital asset insurance and/or digital asset warranties. Digital asset insurance may be insured key storage, which may entail secure storage of one or more keys, such as private keys, where the secure storage service may guarantee the return of the stored private key and will pay out some amount if the key cannot be returned. In embodiments, a digital asset warranty can be a warranty against key loss, which may be a warranty against key loss by a digital asset storage service.

A digital asset storage service and/or a digital asset protection system may be associated with and/or accessed through one or more digital wallets. In embodiments, digital asset protection and/or storage services may only be available when using a particular digital asset wallet and/or when employing particular storage mechanisms or procedures. In embodiments, a digital wallet may provide an option to request and/or accept protection and/or an option to request and/or accept storage of one or more keys associated with the wallet. In embodiments, a wallet may prompt and/or require a user to store the private key of the wallet, e.g., using the secure digital asset storage service.

Figure 36A:
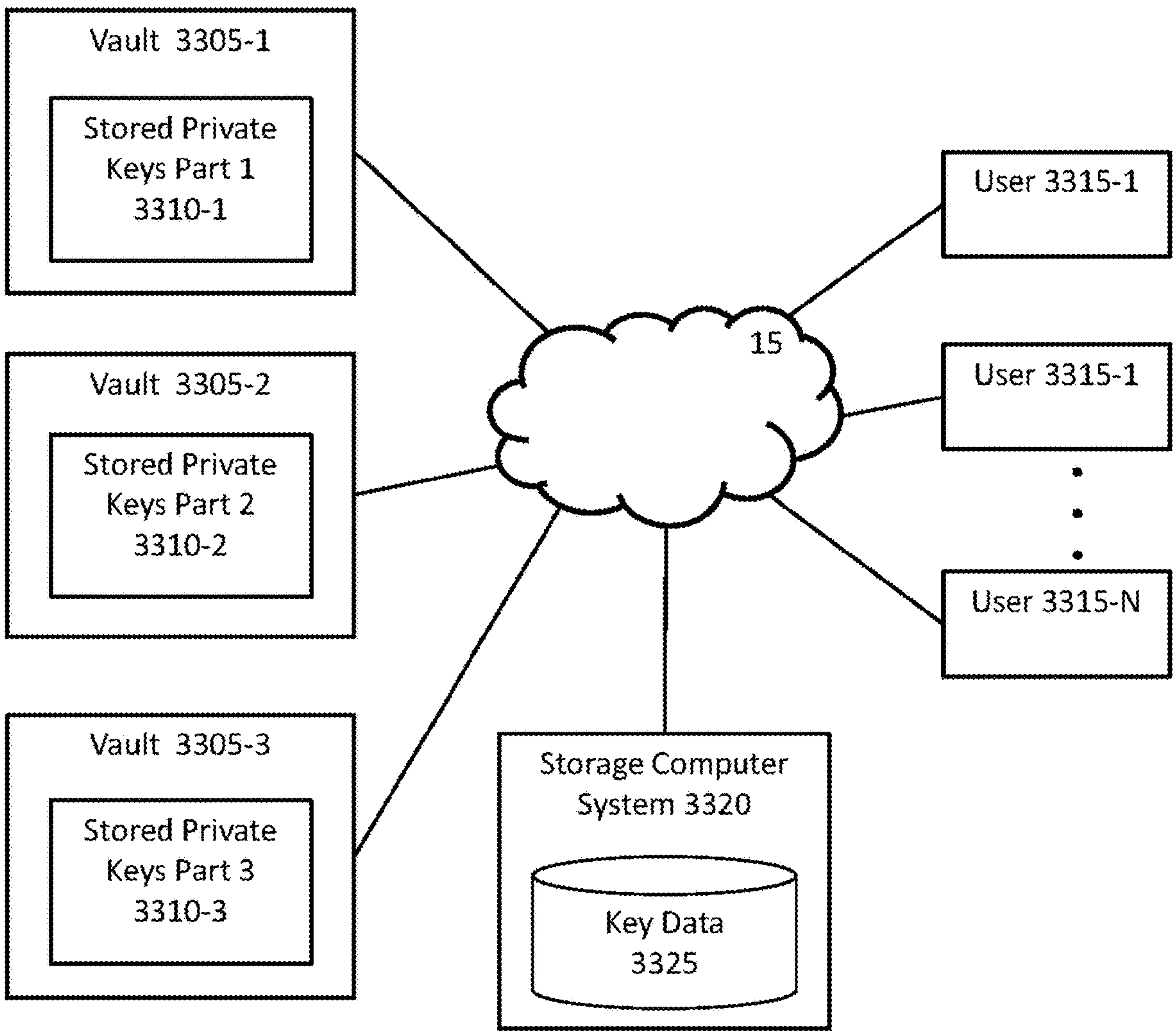
FIGS. 36A-36B are schematic diagrams of vault arrangements for a digital asset network in accordance with exemplary embodiments of the present invention.

FIG. 36A illustrates an exemplary system for providing secure digital asset storage and/or protection. A storage computer system 3320 may store in computer-readable media or otherwise be connected to one or more databases containing data 3335 relating to one or more digital asset or key storage policies. In embodiments, data 3335 can also include information relating to a stored or insured digital wallet, such as public keys, public addresses, and/or key storage information, which may comprise identification codes or other indicators of where keys or key segments are stored. The storage computer system 3320 may store key data 3325 in internal or external computer-readable memory comprising one or more databases. Key data 3325 can include public key data, information identifying a key owner or wallet owner, information (e.g., an identifying code) identifying or correlating a wallet's keys or key segments, and/or information identifying location and/or retrieval information for stored keys or key segments, to name a few.

The exemplary system illustrated in FIG. 36A can include a plurality of secure storage locations, such as vaults 3305-1, 3305-2, and 3305-3. Private keys or key segments 3310-1, 3310-2, and 3310-3 may be stored in each vault in accordance with the secure storage systems and methods discussed herein, such as cold storage vaulting in different locations. Vaults may be connected to a network 15 at times and disconnected at other times. The network 15 may be any data network or a plurality of connected networks, internal, such as an intranet, or external, such as the Internet. A plurality of keys corresponding to a multi-key wallet may be stored in separate vaults. In embodiments, one or more keys may be divided into segments, which can be stored in separate vaults. Keys may be divided whether from single private key wallets or multi-key wallets.

One or more users 3315 may be, e.g., customers and/or claimants of a digital asset storage and/or protection system. Users 3315 may obtain key storage for one or more digital wallets containing digital assets in one or more denominations. Users 3315 may access or otherwise participate in a digital asset storage and/or protection system using one or more user device. In embodiments, the same digital wallet may be accessed from a plurality of user devices using the same key combinations (e.g., private and public keys).

Figure 36B:
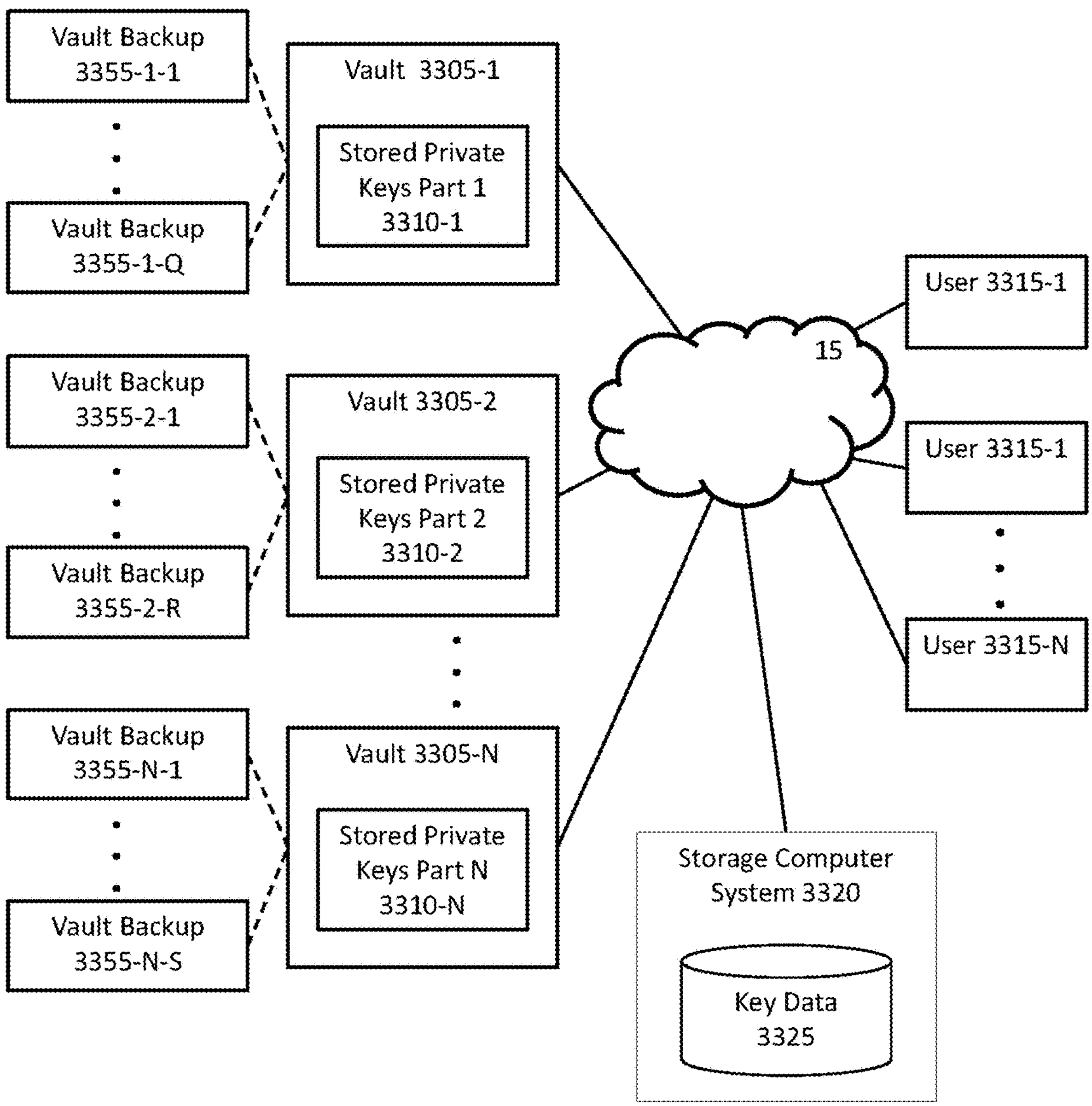

FIG. 36B shows another exemplary embodiment of a system for providing secure digital asset storage and/or protection. A plurality of vaults 3305-1 to 3305-N may be employed to store keys or key segments in segregated locations. In embodiments, vaults may be secure locations, such as safety deposit boxes, bank vaults, rooms with controlled access, to name a few. Vaults may be physical and/or electronic repositories for keys or key segments. In addition, each vault may have one or more backups 3355 (e.g., Q number of backups for vault 3305-1, R number of backups for vault 3305-2, and S number of backups for vault 3305-N). Vault backups may be other vaults or other secure storage facilities, units, or devices. Vault backups may utilize the same or different types of storage from each other and/or from the primary vault. For example, a primary vault may include printed paper copies of keys or key segments stored in a bank lockbox, while a backup may comprise an offline encrypted hard drive storing data corresponding to keys or key segments. Vault backups 3355 can be any of physical storage of printed or transcribed keys or key segments, remote cloud storage, hard drive, disk, CD, DVD, memory card, flash drive, tape drive, and/or tape library, to name a few.

Storage of Keys by a Digital Asset Storage Service

Figure 37A:
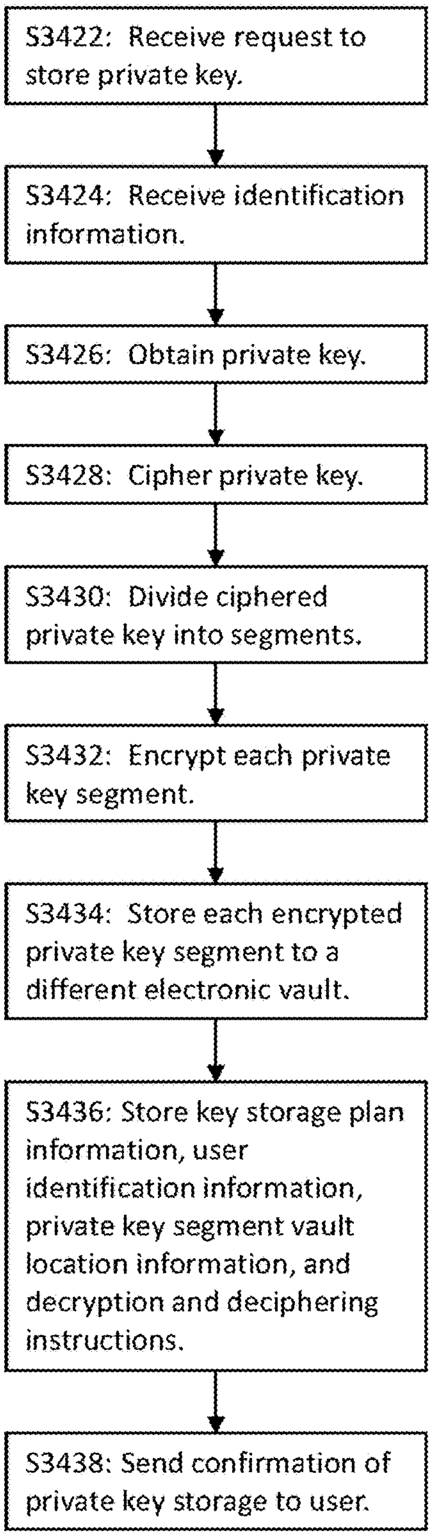
FIGS. 37A-37B are flow charts of processes for generating key storage and insurance in accordance with exemplary embodiments of the present invention.
Figure 37B:
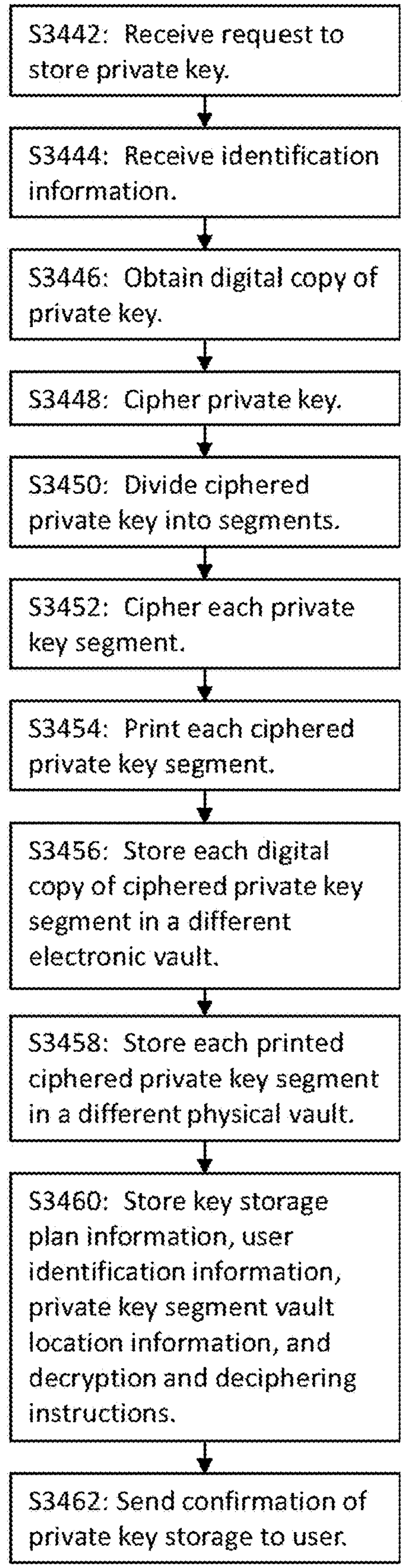

As discussed herein, a digital asset storage service may be provided to users of a digital asset network to provide secure storage of digital assets. In embodiments, the secure storage service may be used in conjunction with a digital asset protection plan, such as an insurance or warranty plan, although the storage service may also be used without insurance or warranties. FIGS. 37A-37B describe exemplary processes for storing private keys, which may be used solely as a key storage service or in conjunction with protection plans, such as insurance or warranty plans.

In embodiments, a user of a digital asset network may provide one or more keys or key segments to the key storage service for storage. Keys or key segments may be provided to the storage service via email or other electronic data transfer, any of which may be secure or otherwise encrypted. A user may use software to generate a wallet with one or more private keys and/or to divide the keys into segments. The software may include the ability to transmit, e.g., via a secure connection, the keys or key segments to the secure storage company. In embodiments, keys may be delivered to a key storage company in person, via mail, or via fax. Such keys may be stored in accordance with the secure and cold storage vault security mechanisms discussed herein, which may include dividing the keys into segments if not already divided.

Keys may also be generated at the secure storage company, e.g., at the secure storage site. Accordingly, a user may log into a website or otherwise connect to a portal for accessing wallet generation software. Such software may be running on one or more processors located at the secure storage company. The user may use the wallet generation software to create a wallet with one or more private keys. The user may also use such software to split one or more keys into key segments. Each key or key segment may then be printed, transcribed, or otherwise prepared for storage. In embodiments, the software may be programmed to transmit each key or key segment to a different printer, printing device, or electronic storage device, any of which may be located in different rooms, on different premises, in different geographies, and/or in separate vaults, to name a few. Thus, the key storage service may then store each key or key segment in separate locations, in accordance with the secure storage mechanisms discussed herein, such as the cold storage vault systems. Accordingly, the key storage company may never have access to an assembled key or to the required plurality of keys to a multi-key wallet.

Upon a user's request for retrieval of a stored key or keys, the secure key storage company may send to the user originals or copies, physically or electronically, of the keys or key segments. In embodiments, the key storage company may never reassemble keys or access a digital wallet itself. The secure key storage company may charge fees at setup and/or at retrieval, as well as recurring storage fees.

FIG. 37A describes an exemplary embodiment of a process for secure key storage and arranging for insurance or warranties against lost private keys, which process may be performed using a digital asset storage system, as discussed herein. The digital asset storage system may comprise and/or form a part of a digital asset protection system. FIG. 37A refers to the storage of private keys, but the process may apply to the storage of both private and public keys.

FIG. 37A is a flow chart of an exemplary process for securely storing private key information, which may be performed by a secure digital asset storage system. In step S3422, a request to store a private key may be received at the secure digital asset storage system. In embodiments, such a request may comprise a request for insured private key storage. Such a request may originate from one or more other computers or electronic devices, such as a mobile phone, digital asset transaction kiosk, and/or personal computer, to name a few.

In step S3424, a user may provide identification information, which may be received at the storage system Identification information may comprise any of a name, contact information (e.g., address, telephone number, e-mail address, to name a few), government ID information (e.g., an image of a driver's license, a driver's license ID number, a passport number, to name a few), biometric information (e.g., a voice sample, current photograph, eye scan, fingerprint, to name a few), username, password, and/or one or more security questions, to name a few. The identification information may be provided by and/or correspond to the requestor of private key storage and/or the private key owner. In embodiments, the digital asset insurance system may receive and/or store a user's identification information.

In step S3426, the storage system may obtain a private key to be stored. The storage system may receive the key or fetch it, e.g., from a user electronic device, such as a mobile phone. In embodiments, the storage system may also obtain a public key to be stored.

In step S3428, the storage system may cipher the private key, as described herein. In embodiments, the private key may not be ciphered before dividing it into segments. In other embodiments, the private key may be encrypted.

In step S3430, the digital asset storage system may divide the ciphered private key into any number of segments. In the case of a multi-key wallet, the keys may not be divided into segments. However, keys to a multi-key wallet may be encrypted and/or ciphered.

In step S3432, the storage system may encrypt each private key segment. In embodiments, encryption and/or ciphering may occur only before or only after dividing a key into segments. In embodiments, the key segments may not be encrypted after the segments are created. The key segments may be ciphered or not processed further.

In step S3434, the storage system may transfer each encrypted private key segment to a different electronic vault for storage. In embodiments, the vaults may not be electronic, and the key segments may be printed or otherwise transcribed on a physical substrate and stored in the vaults. Any number of vaults may be used (e.g., one vault for each key segment, multiple vaults for redundant copies of each key segment, one or more vaults with two or more key segments stored together, to name a few). A code, such as a bar code or QR code, may be provided along with the key segments (e.g., printed with a physically transcribed copy of a key segment electronically saved with an electronic key segment, or appended to an electronic key segment, to name a few). The code may identify the key segments (e.g., which key segments are part of the same key) and/or the order of the key segments.

In step S3436, the storage system may store, in one or more databases, key storage plan information (e.g., a subscription for key storage costing $1.99/month), user identification information, private key segment vault location information, and decryption and deciphering instructions. The databases may be computer-readable databases or physical (e.g., paper) databases that may be scanned and then read by one or more computers. In embodiments, the stored information may be sent to a user and/or a storage system administrative coordinator, which may be a computer that can handle retrieval of stored keys.

In step S3438, the digital asset storage system may send confirmation of private key storage (e.g., over a data transfer network) to the user (e.g., requestor of private key storage or other person associated with the received identification information) and/or a third party. Confirmation of storage may be recorded by the storage system and/or another entity associated with the storage system.

FIG. 37B illustrates that physical back-ups of the secured private key may be employed by a secure digital asset storage system. In step S3442, a request to store a private key may be received at the storage system.

In step S3444, the storage system may receive user or digital wallet owner account identification information.

In step S3446, the storage system may obtain (e.g., receive or fetch) a private key.

In step S3448, the storage system may cipher the private key. In embodiments, no ciphering may occur before dividing the key into segments.

In step S3450, the storage system may divide the private key (or ciphered private key) into segments.

In step S3452, the storage system may cipher each private key segment.

In step S3454, the storage system may print each ciphered private key segment. One or more copies of the key segments may be printed and/or otherwise transcribed onto any substrate and/or multiple substrates (e.g., paper, plastic, metal, to name a few). A code, such as a QR code or bar code, may be used to identify corresponding key segments and/or the order of the key segments. Such a code may be printed or otherwise provided with the key segments.

In step S3456, the digital asset storage system may store each ciphered private key segment, as discussed herein. The key segments may be stored in electronic vaults (e.g., hard drives, tape drives, solid state memory, to name a few). Separate vaults may be used for each key segment, although multiple key segments corresponding to multiple different private keys may be stored in the same vault.

In step S3458, the storage system may store each printed key segment in a physical vault, which may be separate vaults for each key segment.

In step S3460, the storage system may store, in one or more databases, key storage plan information, user identification information, private key segment vault location information, deciphering instructions, and decryption instructions, where applicable.

In step S3462, the storage system may send confirmation of private key storage to the user.

Recovering Stored Keys from a Digital Asset Key Storage Service

A user of a secure storage service or system may request access to a stored key, which may be a means of recovering a lost key.

FIG. 38A is a flow chart describing an exemplary process for recovering a key, which may be performed by one or more computers. In embodiments, the process may entail recovering (e.g., retrieving from storage) a plurality of keys or key segments.

In step S3502, a user may submit a claim for a lost private key, which may be received by a computer system of a secure storage service storing a copy of the user's private key. A claim may be a request for retrieval of one or more stored keys.

In step S3504, the storage system, using the computer system, may correlate the received claim to one or more locations where private key segments are stored. For example, the computer system may access a database of policy information to determine where (e.g., in which vaults) a claimant's keys or key segments are stored.

In step S3506, a message, which may constitute instructions, may be transmitted to one or more storage facilities to retrieve the private key segments. A computer system may automatically generate such a message based upon the information pertaining to stored keys or key segments. Such a key retrieval message can include a security code or other authorization to access a secure storage location. In embodiments, the computer system may employ security measures, such as a secure code or digital signature, to provide verification and/or authentication of a retrieval message.

In step S3508, the private key segments may be verified. Keys or key segments may be retrieved from their respective storage locations. Quality control measures may verify that the correct key segments were retrieved and/or that the keys or key segments are readable, e.g., by a specially programmed scanning device, such as a QR scanner.

In step S3510, the private key segments may be transmitted to a device and/or account corresponding to the user. One or more secure transmissions may be used. Two-factor authentication may be required of the recipient before a transmission is sent and/or opened by the recipient. In embodiments, the system may decrypt, reassemble, and/or decipher private keys and/or key segments before returning the keys and/or key segments to a user. In embodiments, a user may be provided with the option of having the system perform the decrypting, reassembling, and/or deciphering steps. In embodiments, software may be provided to a user to enable such steps to be performed by a user or under a user's control. In embodiments, the computer system may never decrypt keys or key segments that were encrypted by a user. Accordingly, in step S3510, the user may be provided with key segments and/or reassembled keys, which may be in various states of security (e.g., ciphered, segmented, and/or encrypted).

In step S3512, the system may receive confirmation that the user received the private keys or key segments. A user device may automatically generate and/or transmit a confirmation upon receipt of the keys or key segments, upon reassembling thereof, upon opening a corresponding digital asset wallet, or upon instruction for a user, to name a few. Such confirmation may provide an indication that the secure storage service and/or protection service met its obligation, e.g., to the customer.

FIG. 38B illustrates another exemplary process for recovering a key. Such process may be performed by one or more computers. The process may be considered the same as the process of FIG. 38A, except with the addition of a user authentication step S3524.

Thus, in step S3522, a user may submit a claim for a lost private key, which may be received by a secure storage service storing a copy of the user's private key.

In step S3524, the secure storage system may authenticate the identity of the claimant. Authentication may involve any of receipt of any of a user's identification information, such as name, username, password, biometric information, or the like. In embodiments, three forms of identification information may be required. In embodiments, a claimant may receive a phone call, which may be auto-generated and auto-executed by the system, which may provide the claimant with a code to input at a user device. In embodiments, the user may be required to repeat a phrase, which may be a unique phrase. Voice analysis and/or recognition techniques may be employed. The user may be required to submit a current picture or video. The system may compare the received identification information to a database of authorized user identification information in order to authenticate the identity of the claimant.

In step S3526, the system may correlate the received claim to one or more locations where private key segments may be stored.

In step S3528, a message, which may constitute instructions, may be transmitted to one or more storage facilities to retrieve the private key segments.

In step S3530, the private key segments may be verified.

In step S3532, the private key segments may be transmitted to a device and/or account corresponding to the user. In embodiments, decryption, reassembly, and or deciphering of private keys and/or key segments may occur before or after returning the keys and/or key segments to a user and may be performed by the system or by a user, who may use software provided by the system.

In step S3534, the system may receive confirmation that the user received the private key segments.

Figure 38C:
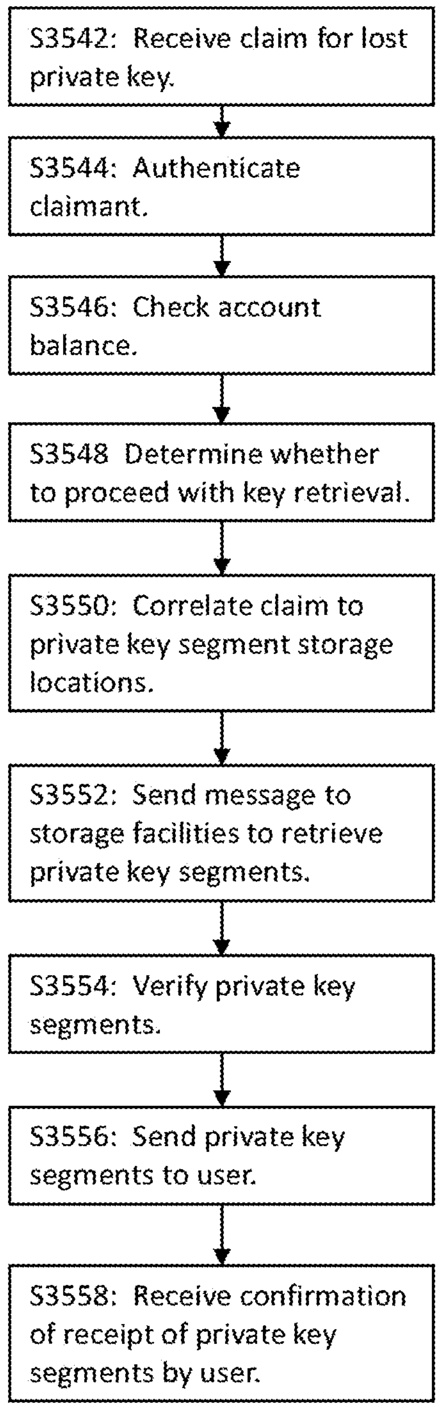

Another exemplary process for recovering a key is provided in FIG. 38C. Such process may be performed by one or more computers. The process may be considered the same as the process of FIG. 38B, except with the addition of steps to check the account balance of the account and a determination step of whether to proceed with the key retrieval.

Thus, in step S3542, a user may submit a claim for a lost private key, which may be received by a secure storage service storing a copy of the user's private key.

In step S3544, the secure storage system may authenticate the identity of the claimant, in manners described for step S3524 of FIG. 38B.

In step S3546, the system may check the account balance of the account.

In step S3548, the system may determine whether to proceed with the requested key retrieval. In embodiments, retrieval may be halted if an account balance is above a threshold or below a threshold.

In step S3550, the system may correlate the received claim to one or more locations where private key segments may be stored.

In step S3552, a message, which may constitute instructions, may be transmitted to one or more storage facilities to retrieve the private key segments.

In step S3554, the private key segments may be verified.

In step S3556, the private key segments may be transmitted to a device and/or account corresponding to the user of the account. In embodiments, decryption, reassembly, and or deciphering of private keys and/or key segments may occur before or after returning the keys and/or key segments to a user and may be performed by the system or by a user, who may use software provided by the system.

In step S3558, the system may receive confirmation that the user received the private key segments.

In exemplary embodiments, a user of a secure storage service or system may be required to provide proof of control of an account before a lost key for that account may be recovered and provided to the user. Exemplary systems and methods for implementing such proof of control are described in further detail below.

Increasing the Total Supply of Digital Asset Tokens

Figure 39A:
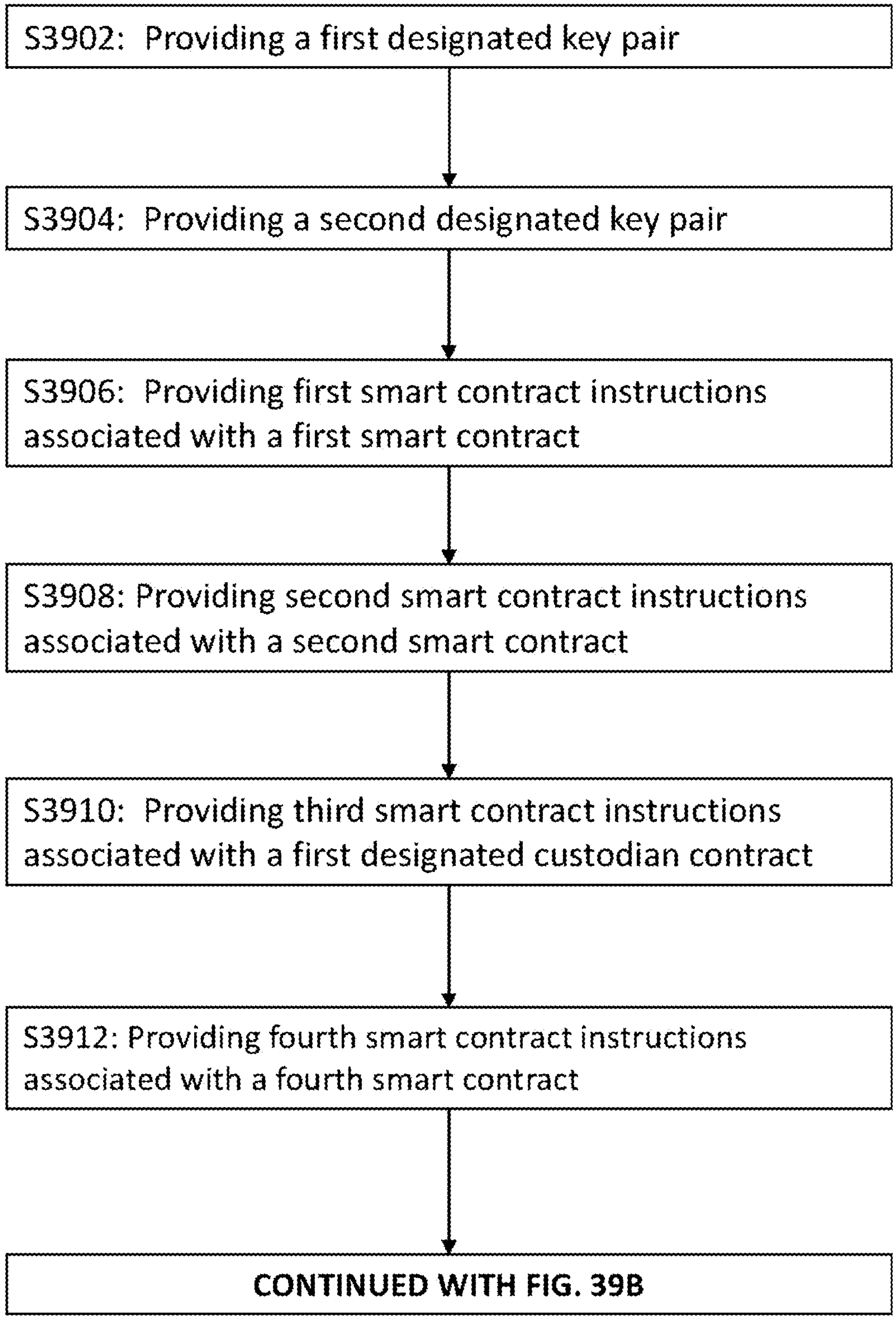
Figure 39B:
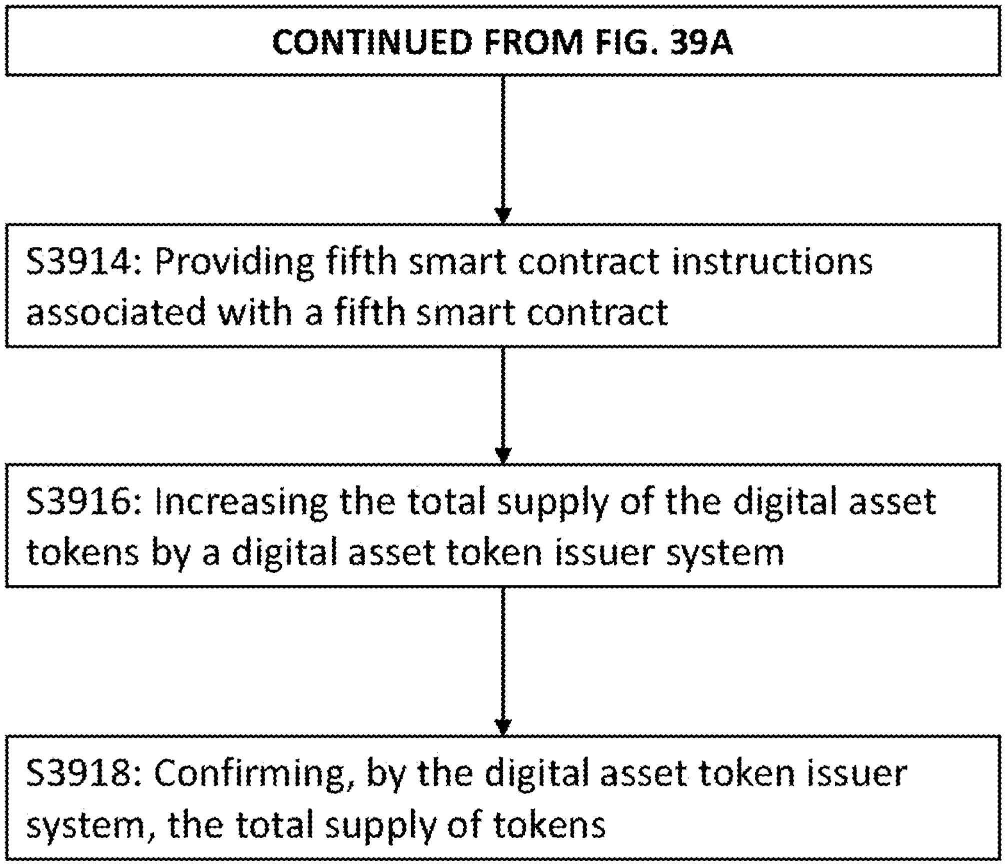

FIGS. 39A-39B illustrates a process for increasing a total supply of digital asset tokens in accordance with exemplary embodiments of the present invention. The process of FIGS. 39A through 39B may begin at a step S3902. At step S3902, a first designated key pair (e.g., on-line keyset 1 1362) may be provided. In embodiments, the first designated key pair may include, at least, a first designated public key and a corresponding first designated private key. The first designated public key, in embodiments, may be used to provide a first designated public address, which may be associated with an underlying digital asset. The underlying digital asset (e.g., NEO, ETHER, to name a few) may be maintained on a distributed public transaction ledger maintained in the form of a blockchain. In embodiments, a first computer system may store the first designated private key, similarly to on-line keyset 1 1362. The first computer system may have access to, or be connected with, the distributed public transaction ledger through a network, such as the internet (e.g., network 15). In embodiments, the first designated private key may be mathematically related to the first designated public key. In embodiments, the first designated public address is the first designated public key. In embodiments, the first designated public address is derived from the first designated public key.

In embodiments, the first designated key pair may include a plurality of key pairs (e.g., on-line keyset N 1362N). For example, the first designated key pair may further include a first additional designated public key and a corresponding first additional designated private key. In embodiments, each key pair of the aforementioned plurality of key pairs of the first designated key pair may each correspond to a designated public address. For example, a first key pair of the plurality of key pairs may correspond to a first designated public address associated with the underlying digital asset. A second key pair of the plurality of key pairs may correspond to a second designated public address associated with the underlying digital asset. In embodiments, each key pair of the aforementioned plurality of key pairs may correspond to the same designated public address. For example, the first and second key pairs mentioned in the examples above may be associated with the same designated public address.

In embodiments, the first designated public address may be derived by using and/or applying a cryptographic hash function of the first designated public key. In embodiments, the first designated public address is a result of the cryptographic hash function, or, in embodiments, at least a part of the result of the cryptographic hash function. A cryptographic hash function may be a hash function that is a mathematical algorithm which maps data of arbitrary size to a bit string of a fixed size (e.g., a hash). In embodiments, the cryptographic hash function may be designed to be a one-way function (e.g., a function that is infeasible to invert). The cryptographic hash function, may include one or more of the following prosperities: (1) deterministic such that the same message produces results in the same hash; (2) high speed, such that the hash value for a message is computed in a manner that does not slow the process down; (3) infeasible to generate a message from the hash, such that generating a message from the hash value would require attempting all possibilities (e.g., a brute force approach); and (4) unique, such that messages to not have the same hash value and/or small changes to a message alter the hash value such that the values do not correlate, to name a few.

The process of FIGS. 39A through 39B may continue at a step S3904. At step S3904, a second designated key pair (e.g., off-line keyset 1 1803) is provided. The second designated key pair, similar to the first designated key pair, may include a second designated public key and a corresponding second designated private key. The second designated public key may be mathematically related to the corresponding second designated private key. In embodiments, the second designated key pair may correspond to the same public address as the first designated key pair (e.g., the first designated public address associated with the underlying asset). In embodiments, the second designated key pair may correspond to a different public address than the first designated key pair. For example, the first designated key pair may correspond to the first designated public address and the second designated key pair may correspond to a second designated public address. In embodiments, where the second designated key pair corresponds to a second designated public address, the second designated public address may be the second designated public key.

In embodiments, the second designated key pair may be stored on a second computer system. The second computer system may be physically and/or operationally separated from the first computer system. Additionally, the second computer system may be physically and/or operationally separated (e.g., not connected to) from the distributed public transaction ledger and/or the internet (e.g., network 15). This separation, as described above in connection with FIG. 18A, may be for security purposes, adding an additional layer of security by ensuring that unwanted access is not granted via network 15.

In embodiments, the second computer system may be a hardware storage module. The hardware storage module may be located in a vault (e.g., Vault 70-A1) Location A, Location B, Location C . . . Location N described above in connection with FIGS. 31A-31D. Additionally, a more detailed description of storage, and particularly cold storage, is located above under the "Cold Storage" heading.

In embodiments, the hardware storage module, may include one or more types of storage mediums such as any volatile or non-volatile memory, or any removable or non-removable memory implemented in any suitable manner to store the second designated key pair. For example, the second designated key pair may be stored using computer-readable instructions, data structures, and/or program systems. Various types of storage/memory may include, but are not limited to, hard drives, solid state drives, flash memory, permanent memory (e.g., ROM), electronically erasable programmable read-only memory ("EEPROM"), CD-ROM, digital versatile disk ("DVD") or other optical storage medium, magnetic cassettes, magnetic tape, magnetic disk storage or other magnetic storage devices, RAID storage systems, or any other storage type, or any combination thereof, to name a few.

In embodiments, the second designated key pair may include a plurality of key pairs (e.g., off-line keyset N 1803N). For example, the second designated key pair may further include a first additional designated public key and a corresponding first additional designated private key. In embodiments, each key pair of the aforementioned plurality of key pairs of the second designated key pair may each correspond to a designated public address. For example, a first key pair of the plurality of key pairs may correspond to a first designated public address associated with the underlying digital asset. A second key pair of the plurality of key pairs may correspond to a second designated public address associated with the underlying digital asset. In embodiments, each key pair of the aforementioned plurality of key pairs may correspond to the same designated public address. For example, the first and second key pairs mentioned in the examples above may be associated with the same designated public address.

In embodiments, the second designated public address may be derived by using and/or applying a cryptographic hash function of the second designated public key. In embodiments, the second designated public address is a result of the cryptographic hash function, or, in embodiments, at least a part of the result of the cryptographic hash function. The cryptographic hash function applied may be similar and/or the same cryptographic hash function applied to the first designated key pair. In embodiments, the cryptographic hash function applied to the second designated key pair may be different than the cryptographic hash function applied to the first key pair. A different cryptographic hash function may be used, in embodiments, as an additional security measure.

In embodiments, the process of FIG. 39A may continue with step S3906 where first smart contract instructions (e.g., PROXY Contract Instructions 1310A-1) associated with a first smart contract (e.g., PROXY Smart Contract 1310) are provided. The first smart contract may have a corresponding first contract address (e.g., Contract Address 1 of Proxy Smart Contract 1310) associated with the blockchain of the underlying digital asset. In embodiments, the first smart contract instructions may be saved as part of the blockchain of the underlying digital asset and/or include one or more of the following instructions: (1) first delegation instructions and/or (2) first authorization instructions, to name a few. The first delegation instructions may delegate one or more first functions associated with the digital asset token to one or more delegated contract addresses associated with the blockchain of the underlying digital asset. The one or more delegated contract addresses, in embodiments, may be different than the first contract address. For example the one or more delegated contract addresses may include a second contract address, which may be different than the first contract address. The first delegation instructions may similar to the delegation instructions described above in connection with PROXY Delegation Instructions Module 1829.

The first authorization instructions, in embodiments, may be associated with the second designated key pair. In embodiments, first authorization instructions may be similar to the authorization instructions described above in connection with PROXY Authorization Instructions Module 1831.

In embodiments, the first smart contract may be PROXY smart contract 1310 described above in connection with FIGS. 18A and 18B, the description of which applying herein.

The process or FIG. 39A may continue with step S3908 where second smart contract instructions (e.g., PRINT LIMITER Contract Instructions 1360A-1) associated with a second smart contract (e.g., PRINT LIMITER Smart Contract 1360) is provided. The second smart contract may be associated with a second contract address (e.g., Contract Address 3 described above in connection with the PRINT LIMITER Smart Contract 1360) associated with the blockchain of the underlying digital asset. The second smart contract instructions may be saved as part of the blockchain for the underlying digital asset and/or include one or more of the following instructions: (1) print limiter token creation instructions, (2) second authorization instructions, and/or (3) third authorization instructions, to name a few.

The print limiter token creation instructions, in embodiments, may indicate one or more conditions under which digital asset tokens of the underlying digital asset are created. In embodiments, the print limiter token creation instructions may be similar to the PRINT LIMITER token creation instructions described above in connection with the PRINT LIMITER Token Creation Instructions Module 1833.

The second authorization instructions, in embodiments, may include instructions to create tokens of the digital asset token. In embodiments, the first designated key pair is designated to authorize the second authorization instructions. In embodiments, the second designated key pair is designated to authorize the second authorization instructions. The second authorization instructions, in embodiments, may include instructions limiting the creation of digital asset tokens. The limitation placed on token creation may prevent the creation of tokens above a first threshold. For example, the second authorization instructions may limit the creation of tokens to 100,000 tokens. In embodiments, the first threshold may be relative to a first period of time. For example, the second authorization instructions may limit the creation of tokens to 500,000 tokens per day. In embodiments, the second authorization instructions may be similar to the first authorization instructions described above in connection with PRINT LIMITER First Authorization Instructions Module 1839.

The third authorization instructions, in embodiments, may also include instructions with respect to token creation. In embodiments, the third authorization instructions may designate a first designated custodian address (e.g., a custodian address associated with CUSTODIAN 2 Smart Contract 1350) with respect to token creation of the digital asset token. In embodiments, the third authorization instructions may be similar to the second authorization instructions described above in connection with PRINT LIMITER Second Authorization Instructions Module 1841.

In embodiments, the second smart contract instructions may also include token balance modification instructions (e.g., instructions of the Token Balance Modification Instructions Module 1847). The token balance modification instructions may be related to modifying the total balance of tokens of the digital asset token assigned to a third delegated contract address. In embodiments, the third delegated contract address may be of the one or more delegated contracted addresses. In embodiments, the token balance modification instructions may be similar to the optional token balance modification instructions described above in connection with Token Balance Modification Instructions Module 1847.

In embodiments, the second smart contract may further include additional authorization instructions. The additional authorization instructions may be similar to the optional PRINT LIMITER THIRD Authorization instructions described above in connection with PRINT LIMITER Third Authorization Instructions Module 1835.

In embodiments, the second smart contract may be PRINT LIMITER Smart Contract 1360 described above in connection with FIGS. 18A and 18C, the description of which applying herein.

In embodiments, the process of FIG. 39A may continue with step S3910 where third smart contract instructions (e.g., CUSTODIAN 2 Contract Instructions 1350A-1) associated with a first designated custodian contract (e.g., CUSTODIAN 2 Smart Contract 1350). In embodiments, the first designated custodian contract is associated with a third contract address (e.g., Contract Address 6 of CUSTODIAN 2 Smart Contract 1350) associated with the blockchain of the underlying digital asset. In embodiments, the third contract address is the first designated contract address designated by the third authorization instructions of the second smart contract. In embodiments, the third smart contract instructions are saved as part of the blockchain of the underlying digital asset and/or include one or more of the following instructions: (1) fourth authorization instructions (e.g., authorization instructions described in connection with CUSTODIAN 2 First Authorization Instructions Module 1849), and/or (2) sixth authorization instructions (e.g., authorization instructions described in connection with CUSTODIAN 2 Second Authorization Instructions Module 1851), to name a few.

The fourth authorization instructions, in embodiments, may authorize the issuance of instructions to the second smart contract. The issued instructions that are authorized by the fourth authorization instructions may regard token creation. In embodiments, the fourth authorization instructions designate the second designated key pair to authorize the fourth authorization instructions. In embodiments, the fourth authorization instructions designate the first key pair to authorize the fourth authorization instructions. In embodiments, the fourth authorization instructions include instructions to permit the creation of digital asset tokens above a first threshold defined by the second authorization instructions. In embodiments, the fourth authorization instructions may be similar to the authorization instructions described in connection with CUSTODIAN 2 First Authorization Instructions Module 1849.

The sixth authorization instructions, in embodiments, may designate a seventh contract address as one of the one or more delegated contract addresses. In embodiments, the seventh contract address is not the second contract address. In embodiments, the second designated key pair is designated to authorize the sixth authorization instructions. In embodiments, the first designated key pair is designated to authorize the sixth authorization instructions. In embodiments, the sixth authorization instructions may be similar to the authorization instructions described in connection with CUSTODIAN 2 Second Authorization Instructions Module 1851.

In embodiments, the third smart contract may be CUSTODIAN 2 Smart Contract 1350 described above in connection with FIGS. 18A and 18D, the description of which applying herein.

In embodiments, the process of FIG. 39A may continue with step S3912 where fourth smart contract instructions (e.g., IMPL Smart Contract Instructions 1320A-1) associated with a fourth smart contract (e.g., IMPL Smart Contract 1320). In embodiments, the fourth smart contract is associated with a fourth contract address (e.g., Contract Address 2 of IMPL Smart Contract 1320), to name a few. The fourth contract address, in embodiments, may be one of the one or more delegated contract address. Additionally, the fourth contract address, in embodiments, may be different from one or more of: the first contract address, the second contract address, and/or the third contract address. The fourth smart contract instructions may be saved as part of the blockchain and/or include one or more of the following instructions. (1) token creation instructions (e.g., instructions of IMPL Token Creation Instructions Module 1865), (2) second delegation instructions (e.g., instructions of IMPL Delegation Instructions Module 1837), (3) token transfer instructions (e.g., instructions of IMPL Token Transfer Instructions Module 1861), and/or (4) token destruction instructions.

The token creation instructions may, in embodiments, be instructions to create tokens of the digital asset tokens. In embodiments, the token creation instructions may create tokens in accordance with the conditions set forth by the print limiter token creation instructions of the second smart contract. The token creation instructions may be similar to instructions described in connection with the IMPL Token Creation Instructions Module 1865.

The second delegation instructions, in embodiments, may delegate data storage operations to at least a fifth contract address. In embodiments, the fifth contract address may be associated with Contract Address 4 of STORE Smart Contract 1330. For example, the second delegation instructions may cause STORE Smart Contract 1330 to execute storage instructions of Storage Instructions Module 1853. The second delegation instructions may be similar to instructions described in connection with IMPL Delegation Instructions Module 1861.

In embodiments, the token transfer instructions may be related to transferring issued tokens of the digital asset token. The transfer of tokens may be from a first designated contract address to a second designated contract address. For example, issued tokens may be transferred from a contract address associated with a digital asset token issuer system to a user public address associated with a user attempting to purchase tokens of the underlying digital asset. The token transfer instructions may be similar to instructions described in connection with IMPL Token Transfer Instructions Module 1859.

In embodiments, the token destruction instructions may be related to destroying and/or burning one or more issued tokens of the digital asset token. For example, if a user is attempting to exchange a token for, as an example, fiat, the token being exchanged may be burned once the token is exchanged for fiat.

In embodiments, the fourth smart contract may be IMPL Smart Contract 1320 described above in connection with FIGS. 18A and 18F, the description of which applying herein.

In embodiments, the process of FIG. 39A may continue with the process of FIG. 39B. The process of FIG. 39B may continue with step S3914 where fifth smart contract instructions (e.g., STORE Contract Instructions 1330A-1) associated with a fifth smart contract (e.g., STORE Smart Contract 1330) are provided. The fifth contract address, in embodiments, may be one of one or more designated store contract addresses. In embodiments, the fifth smart contract instructions may be saved as part of the blockchain of the underlying digital asset and/or include one or more of the following instructions: (1) data storage instructions (e.g., instructions of Storage Instructions Module 1853) and/or (2) fifth authorization instructions (e.g., instructions of STORE Authorization Instructions Module 1855), to name a few.

The data storage instructions, in embodiments, may include instructions to store transaction data related to the digital asset token. Transaction data, in embodiments, may include transaction information for one or more of the issued tokens of the digital asset token. The transaction information may include at least one of: (1) respective public address information associated with the blockchain of the underlying digital asset, and/or (2) corresponding respective token balance information which may be associated with the aforementioned respective public address information. In embodiments, the transaction data may include transaction information for all of the issued tokens of the digital asset token. In embodiments, the data storage instructions may be similar to instructions described in connection with Storage Instructions Module 1853.

The fifth authorization instructions may include authorization instructions to modify the transaction data in response to a request. In embodiments, the request may be received from the fourth contract address. The fifth authorization instructions may be similar to instructions described above in connection with STORE Authorization Instructions 1855.

In embodiments, the fifth smart contract may be STORE Smart Contract 1330 described above in connection with FIGS. 18A and 18E, the description of which applying herein.

In embodiments, the process of FIG. 39B may continue with step S3916 where the total supply of digital asset tokens may be increased by a digital asset token issuer system. In embodiments, the total supply of digital asset tokens may be increased from a first amount to a second amount. A more detailed description of the process of step S3916 is located in the flow charts of FIGS. 39C-39E.

Figure 39C:
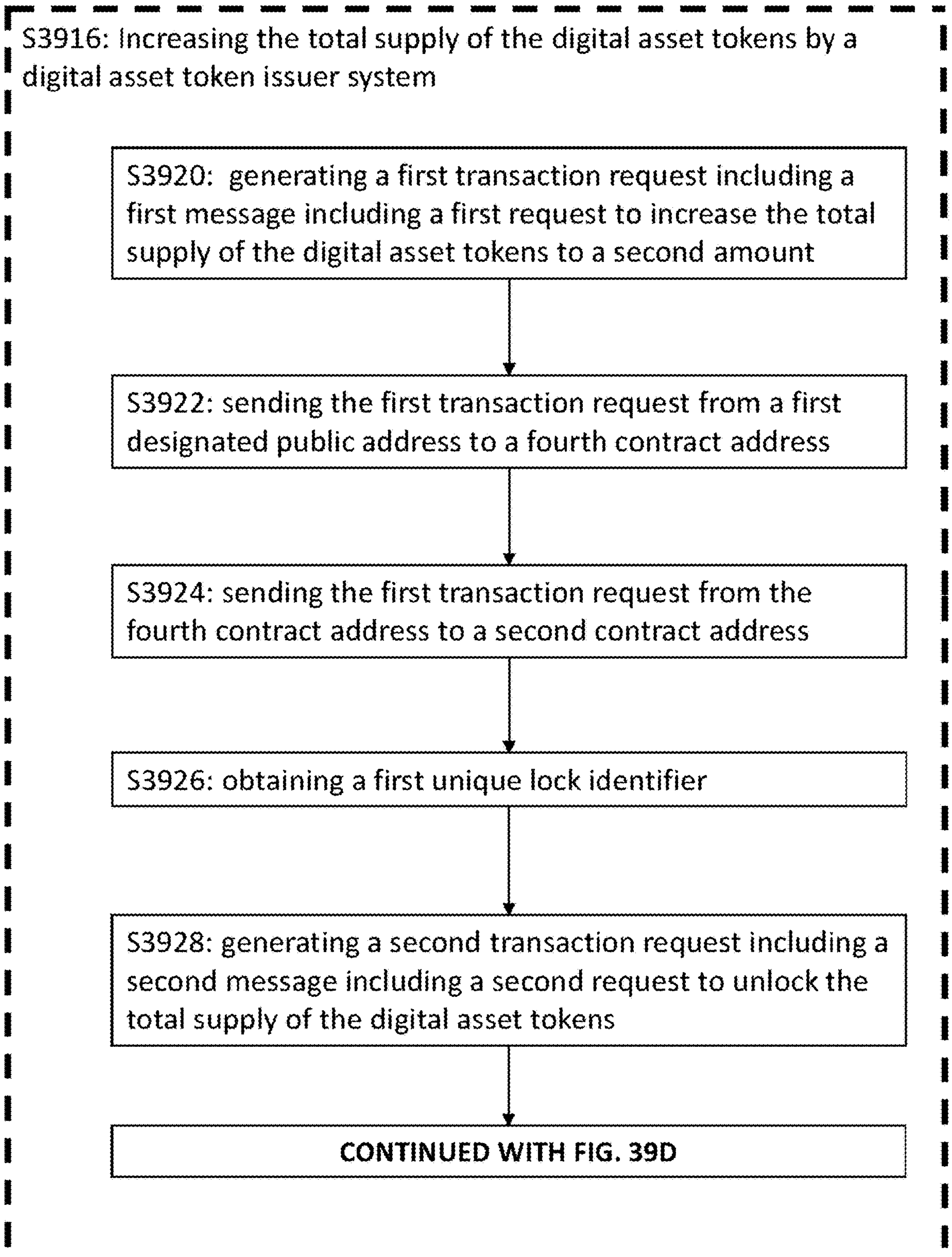

Referring to FIG. 39C, the process of increasing the total supply of digital asset tokens may begin with step S3920 where a first transaction request may be generated. The first transaction request may include a first message that may include a first request to increase the total supply of digital asset tokens to the second amount of digital asset tokens. In embodiments, the first transaction request may be sent from a contract address associated with the digital asset token issuer system to the fourth contract address. In embodiments, the first transaction request may be digitally signed by the first designated private key. In embodiments, the first transaction request may be signed by the second designated private key. In embodiments, the first transaction request may include first transaction fee information for miners associated with the plurality of geographically distributed computer systems in the peer-to-peer network. The first transaction fee information may be a predetermined amount of currency which may be related to the cost of processing the first transaction request.

In embodiments, the first request may be to decrease the total supply of digital asset tokens to a third amount. This example may follow the same process described in connection with FIGS. 39C-39E, with the third amount of digital asset tokens being less than the first amount of digital asset tokens.

The process may continue with a step S3922. In embodiments, at step S3922, the first transaction request may be sent by the digital asset token issuer system, from the first designated public address to the fourth contract address. In embodiments, the first transaction request may be sent via the blockchain of the underlying digital asset. In embodiments, the first transaction request may be sent via network 15.

The process may continue with step S3924 where the first transaction request may be sent from the fourth contract address to the second contract address via the blockchain for the underlying digital asset. In embodiments, once the first transaction request is received by the second contract address, the second smart contract may execute the first transaction request. The execution of the first transaction request may, in embodiments, be to return a first unique lock identifier associated with the first transaction request. In embodiments, the first transaction request is executed via the plurality of geographically distributed computer systems in the peer-to-peer network with reference to the blockchain for the underlying digital asset.

In embodiments, the process may continue with step S3926, where the digital asset token issuer system may obtain the first unique lock identifier. In embodiments, the first unique lock identifier may be obtained based on reference to the blockchain for the underlying digital asset.

In embodiments, the process may continue with step S3928 where a second transaction request may be generated by the digital asset token issuer system. In embodiments, the second transaction request may be generated in response to the first unique lock identifier being obtained. The second transaction request may, in embodiments, include a second message which may include a second request to unlock the total supply of the digital asset tokens. The second request may be in accordance with the first request. Moreover, in embodiments, the second request may include the first unique lock identifier. In embodiments, the second transaction request may be digitally signed by the first designated private key. In embodiments, the second transaction request may be digitally signed by the second designated private key. In embodiments, the second transaction request may include second transaction fee information for miners associated with the plurality of geographically distributed computer systems in the peer-to-peer network. The second transaction fee information may be a predetermined amount of currency which may be related to the cost of processing the second transaction request.

Figure 39D:
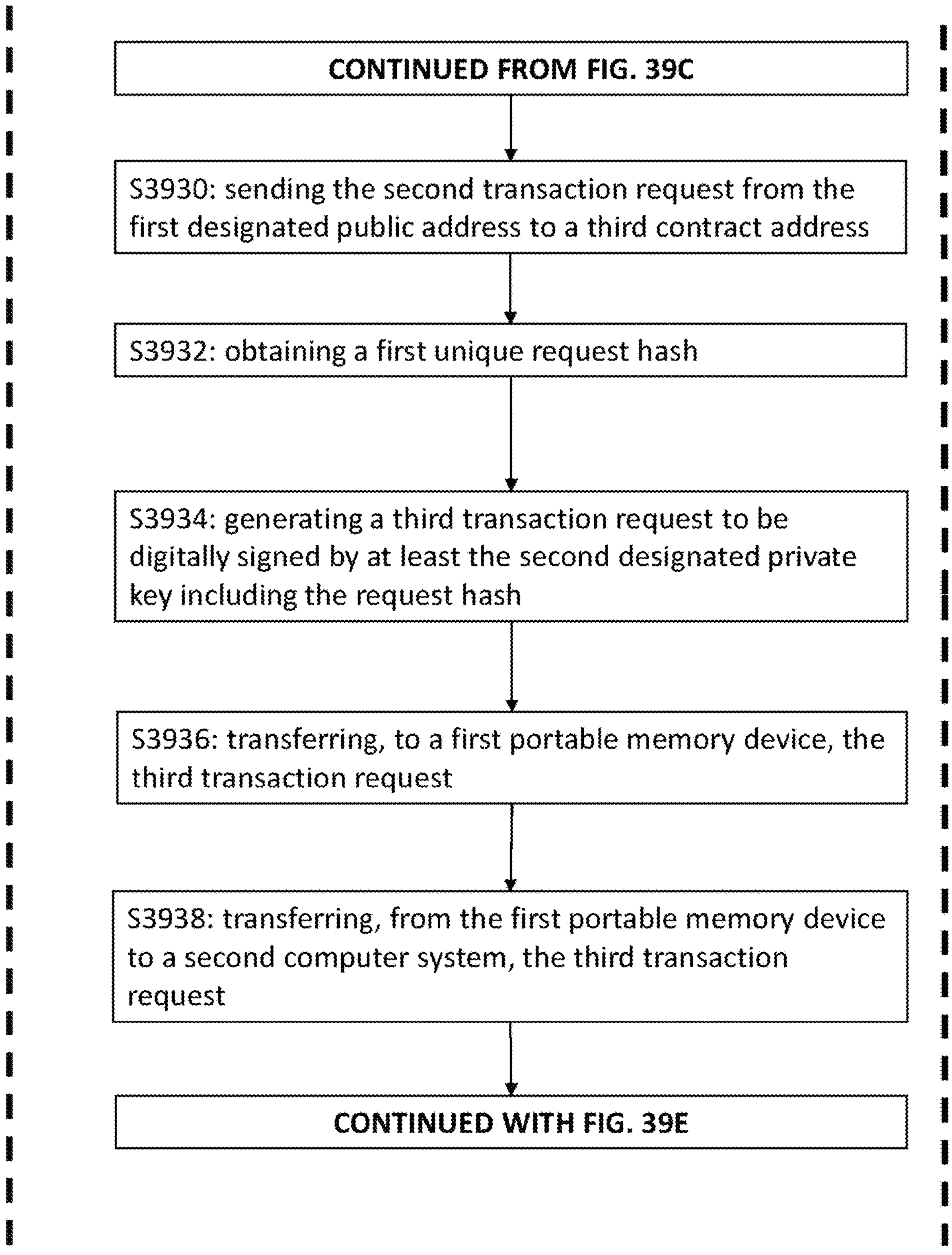

The process of FIG. 39C may continue with the process of FIG. 39D. Referring to FIG. 39D, the process may continue with step S3930 where the second transaction request may be sent from the first designated public address to the third contract address. In embodiments, the second transaction request is sent by the digital asset token issuer system via the blockchain for the underlying digital asset. In embodiments, in response to receiving the second transaction request, the third smart contract may execute the second transaction request. Executing the second transaction request, in embodiments, may include returning a first unique request hash associated with the second transaction request. In embodiments, the second transaction request is executed via the plurality of geographically distributed computer systems in the peer-to-peer network with reference to the blockchain associated with the underlying digital asset.

The process may continue with step S3932 where, in embodiments, the first unique request hash may be obtained by the digital asset token issuer system. In embodiments, the first unique request hash may be obtained based on reference to the blockchain for the underlying digital asset.

At a step S3934, in embodiments, a third transaction request may be generated. The third transaction request may, in embodiments, be generated to be digitally signed by at least the second designated private key. In embodiments, the third transaction request may include the first unique request hash. The third transaction request, in embodiments, may be generated in response to the digital asset token issuer system obtaining the first unique request hash.

In embodiments, at a step S3936, the third transaction request may be transferred to a first portable memory device. In embodiments, the third transaction request may be transferred to the first portable memory device by an administrator (e.g., an administrator of administrator system 1801). In embodiments, the third transaction request may be transferred from the digital asset token issuer system to the first portable memory device. In embodiments, the first portable memory device, may include one or more types of storage mediums such as any volatile or non-volatile memory, or any removable or non-removable memory implemented in any suitable manner to store the third transaction request. For example, the third transaction request may be stored using computer-readable instructions, data structures, and/or program systems. Various types of storage/memory may include, but are not limited to, hard drives, solid state drives, flash memory, permanent memory (e.g., ROM), electronically erasable programmable read-only memory ("EEPROM"), CD-ROM, digital versatile disk ("DVD") or other optical storage medium, magnetic cassettes, magnetic tape, magnetic disk storage or other magnetic storage devices, RAID storage systems, or any other storage type, or any combination thereof, to name a few.

In embodiments, the process may continue with step S3938 where the third transaction request may be transferred from the first portable memory device to the second computer system. In embodiments, the third transaction request may be transferred to the second computer system by an administrator (e.g., an administrator of administrator system 1801).

In embodiments, the process of FIG. 39D may continue with FIG. 39E. Referring to FIG. 39E, at a step S3940, the second computer system digitally may sign the third transaction request using the second designated private key. By digitally signing the third transaction request, the second computer system may generate a third digitally signed transaction request.

In embodiments, once the third digitally signed transaction request is generated, the third digitally signed transaction request may be transferred from the second computer system to a second portable memory device. The second portable memory device may, in embodiments, be the first portable memory device (e.g., the first and second portable memory device are the same portable memory device). In embodiments, the second portable memory device may be physically and operatively separate from the first portable memory device. In embodiments, the second portable memory device, may include one or more types of storage mediums such as any volatile or non-volatile memory, or any removable or non-removable memory implemented in any suitable manner to store the third transaction request. For example, the third transaction request may be stored using computer-readable instructions, data structures, and/or program systems. Various types of storage/memory may include, but are not limited to, hard drives, solid state drives, flash memory, permanent memory (e.g., ROM), electronically erasable programmable read-only memory ("EEPROM"), CD-ROM, digital versatile disk ("DVD") or other optical storage medium, magnetic cassettes, magnetic tape, magnetic disk storage or other magnetic storage devices, RAID storage systems, or any other storage type, or any combination thereof, to name a few.

In embodiments, the process may continue with step S3942 where the third digitally signed transaction request may be sent from the portable memory device to the third contract address using the digital asset token issuer system, via the blockchain for the underlying digital asset. In embodiments, the portable memory device may be the second portable memory device. To send the third digitally signed transaction request, in embodiments, the third digitally signed transaction request may be first transferred from the second portable memory device to the digital asset token issuer system. Once transferred, in embodiments, the third digitally signed transaction request may be sent by the digital asset token issuer system to the third contract address.

In response to receiving the third digitally signed transaction request, in embodiments, the third smart contract may execute the third digitally signed transaction request. In embodiments, the execution of the third digitally signed transaction request may result in a request to validate the second request to unlock the total supply of digital asset tokens based on the third digitally signed transaction request and/or the first unique request hash. In embodiments, the execution may also result in a first call to the second contract address. The first call may be to increase the total supply of the digital asset tokens from the first amount to the second amount. In embodiments, the third smart contract may execute the third digitally signed transaction request via the plurality of geographically distributed computer systems in the peer-to-peer network with reference to the blockchain of the underlying digital asset.

The first call sent by the third smart contract to the second contract address of the second smart contract may, in embodiments, result in the second contract address returning the first call to the fourth contract address. The fourth contract address may, in response to receiving the returned first call, execute a second call to the fifth contract address. The second call, in embodiments, may be to set the total supply of the digital asset tokens to the second amount of digital asset tokens. In embodiments, the fourth smart contract may execute the second call via the plurality of geographically distributed computer systems in the peer-to-peer network with reference to the blockchain of the underlying digital asset.

The second call sent by the fourth smart contract to the fifth contract address of the fifth smart contract may, in embodiments, result in the fifth smart contract executing the second call to set the total supply of the digital asset tokens to the second amount of digital asset tokens. In embodiments, the fifth smart contract may execute the second call via the plurality of geographically distributed computer systems in the peer-to-peer network with reference to the blockchain of the underlying digital asset.

In embodiments, the steps of the process described in connection with FIGS. 39C-39E may be rearranged or omitted.

Referring back to FIG. 39B, the process may continue with step S3918, where the digital asset token issuer system may confirm the total supply of digital asset tokens. The total supply, in embodiments, may be confirmed by the digital asset token issuer system as set to the second amount of digital asset tokens based on reference to the blockchain of the underlying digital asset.

In embodiments, the digital asset token issuer system may determine that the total supply of digital asset tokens is not the second amount of digital asset tokens. For example, the digital asset token issuer system may determine that the total supply of digital asset tokens is set to a third amount, the third amount being different than the second amount of digital asset tokens. In these embodiments, the digital asset token issuer system may generate and/or send a warning message for an administrator (e.g., an administrator of administrator system 1801). In embodiments, the administrator system may be the token issuer system. In embodiments, the administrator system may not be the token issuer system. The warning message may include a notification stating that the amount of tokens is incorrect and/or needs to be fixed. Additionally, the warning message may include a transaction ledger (e.g., Network Digital Asset Transaction Ledger 3228). Moreover, the warning message may include the third amount of digital asset tokens. Furthermore, the warning message may include the intended amount of digital asset tokens (e.g., the second amount of digital asset tokens). In embodiments, if the digital asset token issuer system determines the total supply of tokens is incorrect, the digital asset token issuer system may repeat one or more of the steps of the processes described above in connection with FIGS. 39A-39E in order to set the amount of digital asset tokens from the third amount to the second amount.

In embodiments, the steps of the process described in connection with FIGS. 39A-39B may be rearranged or omitted.

In embodiments, a process for increasing a total supply of digital asset tokens including may begin with providing a first designated key pair. The first designated key pair, in embodiments, may include a first designated public key and a corresponding first designated private key. The first designated private key may also correspond to a first designated public address associated with an underlying digital asset. In embodiments, the underlying digital asset is maintained on a distributed public transaction ledger maintained in the form of a blockchain by a plurality of geographically distributed computer systems in a peer-to-peer network in the form of a blockchain network. In embodiments, the first designated private key is stored on a first computer system which is connected to the distributed public transaction ledger through the Internet (e.g., network 15).

In embodiments, the process may continue with providing a second designated key pair. In embodiments, the second designated key pair includes a second designated public key and a corresponding second designated private key. In embodiments, the second designated public key also corresponds to a second designated public address associated with the underlying digital asset. In embodiments, the second designated private key is stored on a second computer system which is physically separated from the first computer system and is not operatively and/or physically connected to the distributed public transaction ledger or the Internet.

In embodiments, the process may continue with providing first smart contract instructions associated with a first smart contract associated with a digital asset token associated with a first contract address associated with the blockchain associated with the underlying digital asset. In embodiments, the first smart contract instructions are saved as part of the blockchain for the underlying digital assets. In embodiments, the first smart contract instructions include first delegation instructions to delegate one or more first functions associated with the digital asset token to one or more delegated contract addresses associated with the blockchain associated with the underlying digital asset. The one or more delegated contract addresses, in embodiments, is different from the first contract address. In embodiments, a second contract address is designated as one of the one or more delegated contract addresses. In embodiments, the first smart contract instructions include first authorization instructions for the second designated key pair.

The process may continue, in embodiments, with providing second smart contract instructions associated with a second smart contract associated with the digital asset token associated with the second smart contract address associated with the blockchain associated with the underlying digital asset. In embodiments, the second smart contract instructions are saved as part of the blockchain for the underlying digital asset. In embodiments, the second smart contract instructions may include: (1) print limiter token creation instructions indicating conditions under which tokens of the digital asset token are created; (2) second authorization instructions to create tokens of the digital asset token, wherein the first designated key pair is designated to authorize said second authorization instructions to create tokens of the digital asset token; and (3) third authorization instructions with respect to token creation of the digital asset token; wherein the third authorization instructions designate a first designated custodian address with respect to token creation of the digital asset token, to name a few.

In embodiments, the process may continue with providing third smart contract instructions associated with a first designated custodian smart contract associated with the digital asset token associated with a third contract address associated with the blockchain associated with the underlying digital asset. In embodiments, the third contract address is the first designated custodian contract address. In embodiments, the third smart contract instructions are saved as part of the blockchain associated with the underlying digital asset. In embodiments, the third smart contract instructions include fourth authorization instructions to authorize issuance of instructions to the second smart contract regarding token creation. In embodiments, the fourth authorization instructions designate the second designated key pair to authorize the fourth authorization instructions.

In embodiments, the process may continue with providing fourth smart contract instructions associated with a fourth smart contract associated with the digital asset token associated with a fourth contract address associated with the blockchain associated with the underlying digital asset. In embodiments, the fourth contract address is one of the one or more delegated contract addresses and not: (i) the first contract address, (ii) the second contract address, and/or (iii) the third contract address. In embodiments, the fourth smart contract instructions are saved as part of the blockchain associated with the underlying digital assets. In embodiments, the fourth smart contract instructions include: (1) token creation instructions to create tokens of the digital asset token in accordance with conditions set forth by the print limiter token creation instructions; and/or (2) second delegation instructions delegating data storage operations to at least a fifth contract address, to name a few.

In embodiments, the process may continue with providing fifth smart contract instructions associated with a fifth smart contract associated with the digital asset token associated with the fifth contract address associated with the blockchain associated with the underlying digital asset. In embodiments, the fifth smart contract address is one of the one or more designated store contract addresses. In embodiments, the fifth smart contract instructions are saved as part of the blockchain for the underlying digital assets. In embodiments, the fifth smart contract instructions include: (1) data storage instructions for transaction data related to the digital asset token, said transaction data includes for all issued tokens of the digital asset token: (A) respective public address information associated with the blockchain associated with the underlying digital asset; and (B) corresponding respective token balance information associated with said respective public address information; and/or (2) fifth authorization instructions to modify the transaction data in response to requests from the fourth contract address.

In embodiments, the process may continue with receiving, by a digital asset token issuer system, a request to generate and assign to the first designated public address a first amount of digital asset tokens.

In embodiments, the process may continue with generating, by the digital asset token issuer system, the first amount of digital asset tokens and assigning said first amount of digital asset tokens to the first designated public address increasing the total supply of the digital asset tokens. In embodiments, generating the first amount of digital asset tokens and assigning said first amount of digital asset tokens to the first designated public address may include a sub-process.

The sub-process may begin with the step of generating, by the digital asset token issuer system, and sending, using the digital asset token issuer system via the blockchain network, a first transaction request: (A) to the fourth contract address; and (B) including a first message including a first request to generate the first amount of digital asset tokens and assign said first amount of digital asset tokens to the first designated public address. In embodiments, the first transaction request is digitally signed by the first designated private key. In embodiments, the fourth smart contract executes, via the plurality of geographically distributed computer systems in the peer-to-peer network with reference to the blockchain, the first transaction request to: (i) validate the first request and the authority of the first designated private key to call the second smart contract to execute the first request; and (ii) send a first call to the fourth contract address to generate and assign to the first designated public address the first amount of digital asset tokens. In embodiments, the fourth smart contract executes, via the plurality of geographically distributed computer systems in the peer-to-peer network with reference to the blockchain, the first call to generate a first unique lock identifier, and return to the second smart contract address, the first unique lock identifier. In embodiments, in response to the return of the first unique lock identifier, the second smart contract executes, via the plurality of geographically distributed computer systems in the peer-to-peer network with reference to the blockchain, a call to the fourth smart contract address to confirm the first call with the first lock identifier. In embodiments, in response, the fourth smart contract executes, via the plurality of geographically distributed computer systems in the peer-to-peer network with reference to the blockchain, the first call to execute a second call to the fifth contract address to obtain the total supply of digital asset tokens in circulation. In embodiments, in response, the fifth smart contract executes, via the plurality of geographically distributed computer systems in the peer-to-peer network with reference to the blockchain, the second call and returns, to the fourth contract address, a second amount of digital asset tokens corresponding to the total supply of digital asset tokens in circulation. In embodiments, in response to the return of the second amount, the fourth smart contract, executes via the plurality of geographically distributed computer systems in the peer-to-peer network with reference to the blockchain, a third call request to the fifth contract address to set a new total supply of digital asset tokens in circulation to a third amount, which is the total of the first amount and the second amount. In embodiments, in response to the third call, the fifth smart contract, executes via the plurality of geographically distributed computer systems in the peer-to-peer network with reference to the blockchain, the third call and sets a new total supply of digital asset tokens in circulation at the third amount. In embodiments, the fourth smart contract executes, via the plurality of geographically distributed computer systems in the peer-to-peer network with reference to the blockchain, a fourth call to the fifth contract address to add the first amount of digital asset tokens to a respective balance associated with the first designated public address. In embodiments, in response, the fifth smart contract executes, via the plurality of geographically distributed computer systems in the peer-to-peer network with reference to the blockchain, the fourth call to set the balance of digital asset tokens in the first designated public address at a fourth amount which includes the addition of the first amount to the previous balance.

The process for increasing the total supply of digital asset tokens may continue with confirming, by the digital asset token issuer system, that the balance of digital asset tokens associated with the first designated public address is set to include the first amount of digital asset tokens based on reference to the blockchain.

In embodiments, the second computer system is a hardware storage module.

In embodiments, the second designated key set includes an additional designated key set including an additional designated public address and an additional designated private key.

In embodiments, the second authorization instructions for the first designated key set with respect to token creation of the digital asset token include instruction limiting token creation above a first threshold over a first period of time.

In embodiments, the fourth authorization instructions for the second designated key set to authorize the issuance of instructions to the second smart contract instructions with respect to token creation include instructions to allow for creation of digital asset tokens above the first threshold during the first period of time.

In embodiments, the third smart contract instructions further include: (2) sixth authorization instructions to designate a seventh contract address as one of the one or more delegated contract addresses. In embodiments, the seventh contract address is not the second contract address. In embodiments, the second designated key set is designated to authorize the sixth authorization instructions. In embodiments, the fourth smart contract instructions further include: (3) token transfer instructions related to transferring tokens of the digital asset token from a first designated contract address to a second designated contract address. In embodiments, the fourth smart contract instructions further include: (3) token destruction instructions related to destroying one or more digital asset token. In embodiments, the fourth smart contract instructions further include: (3) token balance modification instructions related to modifying a total number of tokens of the digital asset token assigned to a third designated public address. In embodiments, the fourth smart contract instructions further include: (3) token transfer instructions related to transferring tokens of the digital asset token from a first designated contract address to a second designated contract address; and (4) token destruction instructions related to destroying one or more tokens of the digital asset token.

In embodiments, the process further includes receiving, prior to generating the first amount of digital asset tokens, a validating request. In embodiments, the process further includes determining the first designated key set has authority to process the request to generate the first amount of digital tokens.

In embodiments, the first transaction request includes first transaction fee information for miners in the plurality of geographically distributed computer systems in the peer-to-peer network to process the first transaction request.

In embodiments, the fifth contract returns the balance of digital asset tokens to the fourth smart contract address. In embodiments, the fifth contract returns the balance of digital asset tokens to the second smart contract address.

In embodiments, the process further for increasing the total supply of digital asset tokens continues with receiving, by the plurality of geographically distributed computer systems in the peer-to-peer network, from a first user device associated with the first designated public address, via the underlying blockchain, a second transaction request: (A) from the first designated public address; (B) to the first contract address; and (C) including a second message including a second request to transfer a fifth amount of digital assets from the first designated public address to a third designated public address. In embodiments, the first transaction request is digitally signed by the first designated private key, which is mathematically related to the first designated public address. In embodiments, the first user device had access to the first designated private key prior to sending the second transaction request. In embodiments, the first smart contract executes, via the plurality of geographically distributed computer systems in the peer-to-peer network, the second transaction request to execute, via the plurality of geographically distributed computer systems in the peer-to-peer network, a sixth call request to the fourth contract address to transfer a fifth amount of digital assets from the first designated public address to the third designated public address. In embodiments, in response to the sixth call request, the fourth smart contract, executes via the plurality of geographically distributed computer systems in the peer-to-peer network, sixth authorization instructions to verify the sixth call came from an authorized contract address, and upon verification, to execute a seventh call request to the fifth contract address to obtain a sixth amount of digital asset tokens which reflect a current balance of digital asset tokens associated with the first designated public address. In embodiments, in response to the seventh call request, the fifth smart contract, executes via the plurality of geographically distributed computer systems in the peer-to-peer network, the seventh call request to return the sixth amount of digital asset tokens In embodiments, in response to the return of the sixth amount of digital asset, the fourth smart contract executes, via the plurality of geographically distributed computer systems in the peer-to-peer network. (1) a balance verification instruction to confirm that the fifth amount of digital asset tokens is less than or equal to the sixth amount of digital asset tokens, and (2) in the case where the fifth amount of digital asset tokens is less than or equal to the sixth amount of digital asset tokens, execute, via the plurality of geographically distributed computer systems in the peer-to-peer network, a seventh call request to the fifth contract address to set a new balance for the digital asset tokens in the first designated public address to a seventh amount which equals the sixth amount less the fifth amount. In embodiments, in response to the seventh call, the fifth smart contract executes, via the plurality of geographically distributed computer systems in the peer-to-peer network, the seventh call to set and store the new balance for the first designated public address as the seventh amount and returns a new balance for the first designated public address as the seventh amount. In embodiments, in response to the return of the new balance, the fourth smart contract executes, via the plurality of geographically distributed computer systems in the peer-to-peer network, an eighth call to add the second amount of digital asset tokens to the balance associated with the third designated public address. In embodiments, in response to the eighth call request, the fifth smart contract executes, via the blockchain network, the eighth call request to set the balance of digital asset tokens associated with the third designated public address at a seventh amount which includes the addition of the second amount to a previous balance associated with the third designated public address; and wherein the first user device confirms that the balance of digital asset tokens associated with the first designated public address is the sixth amount of digital asset tokens based on reference to the blockchain.

In embodiments, the second transaction request includes second transaction fee information for miners in the plurality of geographically distributed computer systems in the peer-to-peer network to process the second transaction request. In embodiments, the balance of digital asset tokens associated with the third designated public address is returned to the fourth contract address. In embodiments, the balance of digital asset tokens associated with the third public address is returned to the first smart contract address. In embodiments, a second user device confirms that the balance of the digital asset tokens associated with the third designated public address is the seventh amount of digital asset tokens based on reference to the blockchain.

In embodiments, the process of increasing the total supply of digital asset tokens further includes providing a third designated key set, including a third designated public address associated with the underlying digital asset and a corresponding third designated private key, and wherein the third designated private key is stored on a third computer system which is connected to the distributed public transaction ledger through the Internet.

In embodiments, the process continues with receiving, by the plurality of geographically distributed computer systems in the peer-to-peer network, from the third computer system, via the blockchain, a second transaction request: (A) from the third designated public key address; (B) to the fifth contract address; and (C) including a second message including a request to burn a fifth amount of digital asset tokens from a balance associated with the third designated public address. In embodiments, the second transaction request is digitally signed by the third designated private key. In embodiments, the fourth smart contract executes, via the plurality of geographically distributed computer systems in the peer-to-peer network, the second transaction request to execute, via the plurality of geographically distributed computer systems in the peer-to-peer network, a sixth call request to the fifth contract address to obtain a sixth amount of digital asset tokens which reflect a current balance of digital asset tokens associated with the third designated public address. In embodiments, in response to the sixth call request, the fifth smart contract, executes via the plurality of geographically distributed computer systems in the peer-to-peer network, the seventh call request to return the sixth amount of digital asset tokens; wherein, in response to the return of the sixth amount of digital asset, the fourth smart contract executes, via the plurality of geographically distributed computer systems in the peer-to-peer network: (1) a balance verification instruction to confirm that the fifth amount of digital asset tokens is less than or equal to the sixth amount of digital asset tokens; and (2) in the case where the fifth amount of digital asset tokens is less than or equal to the sixth amount of digital asset tokens, execute, via the plurality of geographically distributed computer systems in the peer-to-peer network, a seventh call request to the fifth contract address to set a new balance for the digital asset tokens associated with the third designated public key address to a seventh amount which equals the sixth amount less the fifth amount. In embodiments, in response to the seventh call, the fifth smart contract executes, via the plurality of geographically distributed computer systems in the peer-to-peer network, the seventh call to set and store the new balance for the third designated public key address as the seventh amount and returns the new balance for the third designated public key address as the seventh amount. In embodiments, in response to the return of the new balance, the fourth smart contract executes, via the blockchain network, an eighth call request to the fifth contract address to obtain a total supply of digital asset tokens in circulation. In embodiments, in response to the eighth call request, the fifth smart contract executes, via the plurality of geographically distributed computer systems in the peer-to-peer network, the eighth call request and returns, to the fourth contract address, an eighth amount of digital asset tokens corresponding to the total supply of digital asset tokens in circulation. In embodiments, in response to the return of the eighth amount, the fourth smart contract, executes via the plurality of geographically distributed computer systems in the peer-to-peer network, a ninth call request to the fifth contract address to set a new total supply of digital asset tokens in circulation to a ninth amount, which is the eighth amount less the fifth amount. In embodiments, in response to the ninth call request, the fifth smart contract, executes via the blockchain network, the ninth call request and sets a new total supply of digital asset tokens in circulation at the ninth amount, and returns to the fourth contract address.

In embodiments, the third designated key set is the first designated key set. In embodiments, the third designated key set is not the second designated key set. In embodiments, the third designated key set is the second designated key set. In embodiments, the third designated key set is not the first designated key set. In embodiments, the third computer system is the first computer system. In embodiments, the third computer system is not the first computer system. In embodiments, the administrator computer system (e.g., Administrator 1801) includes the first computer system and the third computer system. In embodiments, the administrator computer system includes the first computer system and the second computer system.

In embodiments, the underlying digital asset is a stable value token. In embodiments, the underlying digital asset is NEO. In embodiments, the underlying digital asset is ETHER. In embodiments, the underlying digital asset is BITCOIN.

In embodiments, the first designated private key is mathematically related to the first designated public key.

In embodiments, wherein the first designated public address includes the first designated public key.

In embodiments, the first designated public address includes a hash of the first designated public key.

In embodiments, the first designated public address includes a partial hash of the first designated public key.

In embodiments, the second designated private key is mathematically related to a second designated public key.

In embodiments, the second designated public address includes the second designated public key.

In embodiments, the second designated public address includes a hash of the second designated public key.

In embodiments, the second designated public address includes a partial hash of the second designated public key.

In embodiments, the second smart contract instructions include sixth authorization instructions related to modifying a token supply of the digital asset token.

Withdrawing funds, including in the context of digital assets, is associated with many security concerns. For example, security concerns may include: hacking, fraudulent transactions, to name a few. The aforementioned security concerns, in embodiments, are addressed (either completely or partially) in the context of withdrawing funds by customer and/or administrator created whitelists. A whitelist, in embodiments, may be a list which may include a list of addresses that a customer has pre-authorized to withdraw digital assets. For example, a whitelist associated with a first customer may include a first user public address associated with the first user and a second user public address associated with the first user's family member. As another example, a whitelist may only contain a user's public address which may limit all withdrawals to the user's public address. As another example, a whitelist may not be submitted by the user, and, instead, may be generated by an administrator (e.g., exchange computer system 3230, administrator system 6801, and/or SVCoin administrator 6809, to name a few). The generated whitelist, in embodiments, may be a default security measure implemented by the administrator, which may limit withdrawals to a public address associated with the customer's account. Alternatively, in embodiments, a whitelist may be a list which may include a list of public addresses that a user may not want digital asset tokens withdrawn to. For example, a whitelist may contain a user's old business partner's public address, limiting withdrawals to public addresses that are not the user's old business partner's public address.

Figure 40A:
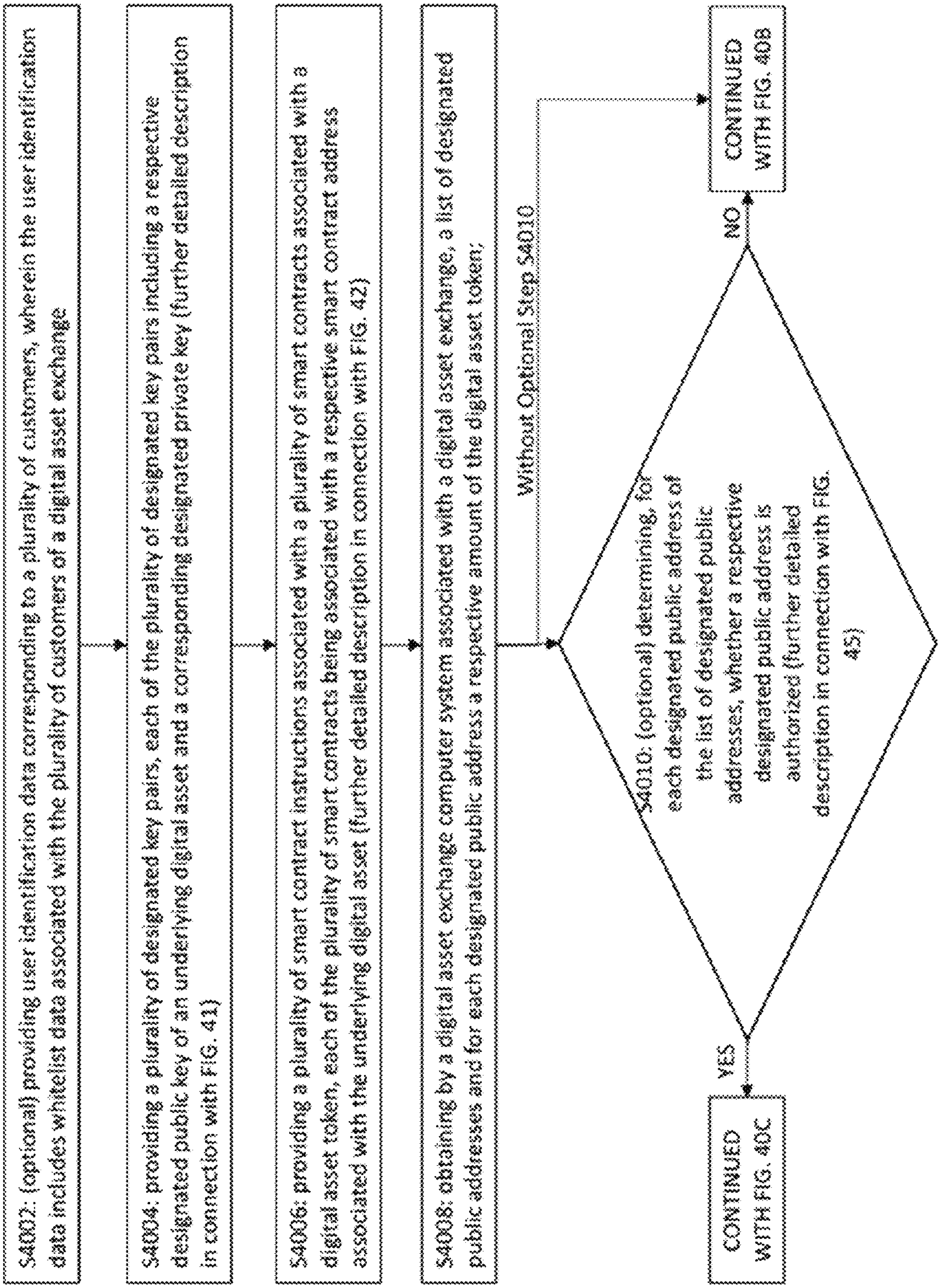
FIGS. 40A-40C are flow charts of processes for withdrawing digital asset tokens in accordance with exemplary embodiments of the present invention.
Figure 40B:
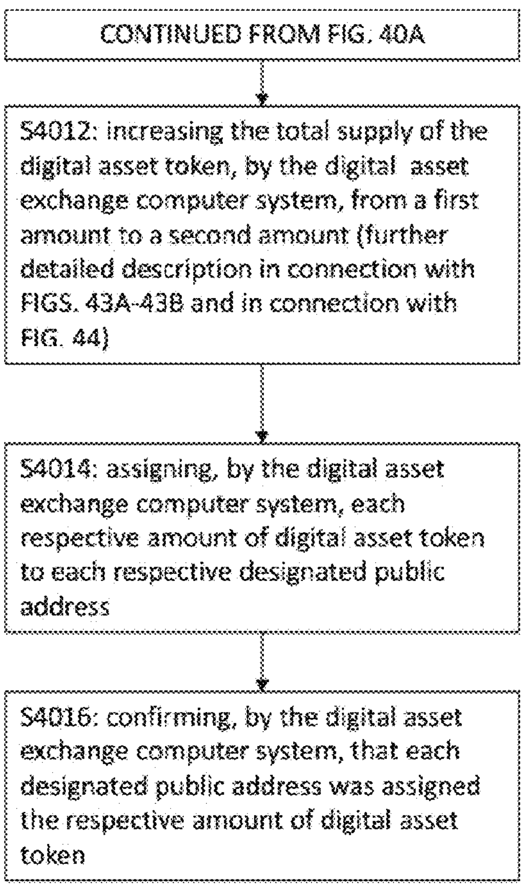
Figure 40C:
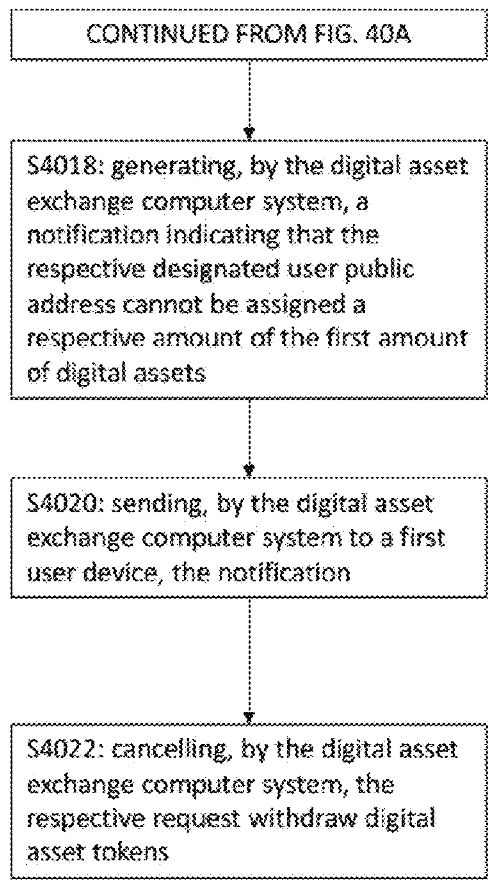

A whitelist may be implemented in the process described in connection with FIGS. 40A-40C. FIGS. 40A-40C are flow charts of processes for withdrawing digital asset tokens in accordance with exemplary embodiments of the present invention. The process of FIGS. 40A through 40C may begin at step S4002, shown in connection with FIG. 40A. Optionally, in embodiments, at step S4002, user identification data corresponding to a plurality of customers may be provided. In embodiments, the user identification data may include whitelist data associated with the plurality of customers (e.g., customers associated with one or more customer devices—e.g., customer's device 3232, customers of a digital asset exchange, to name a few). Whitelist data may, in embodiments, represent one or more whitelists which were: provided by one or more customers, generated by an administrator, and/or provided by a third party associated with the one or more customers, to name a few. For example, at step S4002, a first customer may transmit first whitelist data associated with the first customer. The first whitelist data may include a whitelist that authorizes withdrawals to a first user public address. The first user public address, in embodiments, may be associated with a first user public key which may be associated with the first customer.

In embodiments, a digital asset exchange computer system (e.g., exchange computer system 3230, administrator system 6801, and/or SVCoin administrator 6809, to name a few) may store a plurality of whitelists for a plurality of customers on memory operably connected to the digital asset exchange computer system. Additionally, in embodiments, the digital asset exchange computer system may store a plurality of whitelists for a plurality of customers on a whitelist database on memory operably connected to the digital asset exchange computer system.

Figure 45:
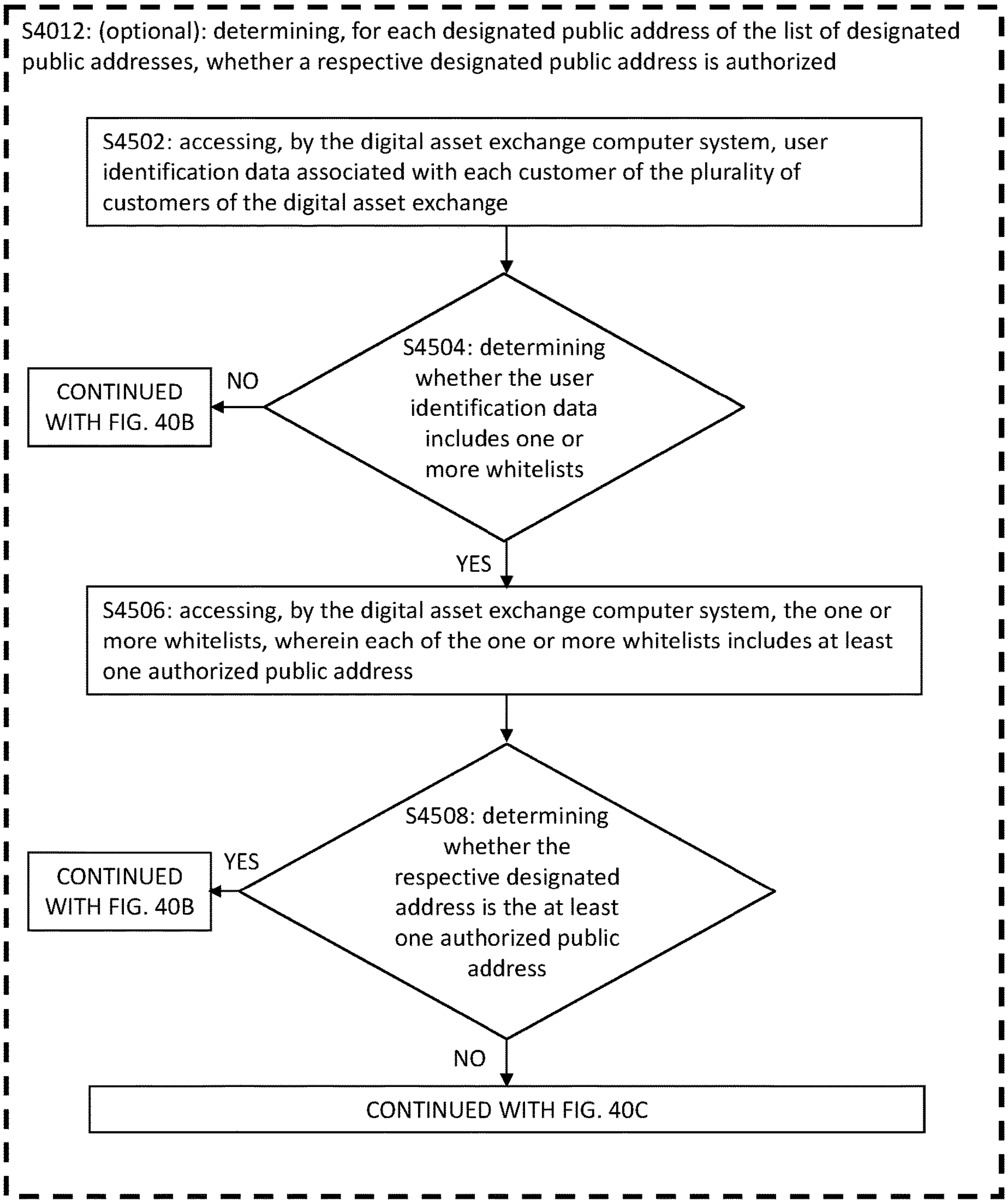
FIG. 45 is a flow chart of a process for verifying a designated public address in accordance with exemplary embodiments of the present invention.

In embodiments, a whitelist may be used by the digital asset exchange computer system to verify a public address associated with a withdrawal request in accordance with the process of FIG. 45, which is described below—the description of which applying herein.

The process may continue at step S4004. At step S4004, a plurality of designated key pairs is provided. The plurality of key pairs, in embodiments, may each include a respective designated public key of an underlying digital asset and a corresponding designated private key. In embodiments, each respective designated public key is mathematically related to a respective corresponding designated private key. The underlying digital asset, in embodiments, may be a digital math-based asset, such as BITCOIN, NAMECOINS, LITECOINS, PPCOINS, TONAL BITCOINS, BITCOIN CASH, ZCASH, IXCOINS, DEVCOINS, FREICOINS, I0COINS, TERRACOINS, LIQUIDCOINS, BBQCOINS, BITBARS, PHENIXCOINS, RIPPLE, DOGECOINS, BARNBRIDGE, POLYGON, SOMNIUM SPACE, OCEAN PROTOCOL, SUSHISWAP, INJECTIVE, LIVEPEER, MASTERCOINS, BLACKCOINS, ETHER, NXT, BITSHARES-PTS, QUARK, PRIMECOIN, FEATHERCOIN, PEERCOIN, FACEBOOK GLOBAL COIN, STELLAR, TOP 100 TOKENS, TETHER; MAKER; CRYPTO.COM CHAIN; BASIC ATTENTION TOKEN; USD COIN; CHAINLINK; BITTORRENT; OMISEGO; HOLO; TRUEUSD; PUNDI X; ZILLIQA; ATOM, AUGUR, 0X, AURORA; PAXOS STANDARD TOKEN; HUOBI TOKEN; IOST; DENT; QUBITICA; ENJIN COIN; MAXIMINE COIN; THORECOIN; MAIDSAFECOIN; KUCOIN SHARES; CRYPTO.COM; SOLVE; STATUS; MIXIN; WALTONCHAIN; GOLEM; INSIGHT CHAIN; DAI; VESTCHAIN; AELF; WAX, DIGIXDAO; LOOM NETWORK, NASH EXCHANGE, LATOKEN; HEDGETRADE; LOOPRING; REVAIN; DECENTRALAND; ORBS; NEXT; SANTIMENT NETWORK TOKEN; POPULOUS; NEXO; CELER NETWORK; POWER LEDGER; ODEM; KYBER NETWORK; QASH; BANCOR; CLIPPER COIN; MATIC NETWORK; POLYMATH; FUNFAIR; BREAD; IOTEX; ECOREAL ESTATE; REPO; UTRUST; ARCBLOCK, BUGGYRA COIN ZERO; LAMBDA; IEXEC RLC; STASIS EURS; ENIGMA; QUARKCHAIN; STORJ; UGAS; RIF TOKEN; JAPAN CONTENT TOKEN; FANTOM; EDUCARE, FUSION, GAS; MAINFRAME; BIBOX TOKEN; CRYPTO20, EGRETIA; REN; SYNTHETIX NETWORK TOKEN; VERITASEUM; CORTEX; CINDICATOR; CIVIC; RCHAIN; TENX; KIN; DAPS TOKEN; SINGULARITYNET; QUANT; GNOSIS; INO COIN; ICONOMI; MEDIBLOC [ERC20]; 0X; AION; ALGORAND; AMP; ARCA; ARWEAVE; AUDIUS; AVALANCHE; BCB; BCC, BITCOIN SV, BLOCKSTACKS; CBAT; CDAI; CELA; CELO; CETH; CHIA, CODA; COSMOS; CWBTC; CZRK; DECRED; DFINITY; EOS; ETH 2.0; FILECOIN; HEDGETRADE; ION, KADENA; KYBER NETWORK; MOBILECION; NEAR; NERVOS; OASIS; OMISEGO; PAXG; POLKADOT; SKALE; DIEM; SOLANA; STELLAR; TEZOS; THETA; XRP; DIEM and/or DEW, to name a few. In embodiments, the underlying digital asset may be a digital asset that is supported by its own digital asset network (like ETHER supported by the ETHEREUM Network, NEO supported by the NEO Network, to name a few). A digital asset token, in embodiments, may be a stable value token (such as GEMINI DOLLAR, PAXG, EFIL, EDOT, EXTZ, EATOM, to name a few), asset-backed token (LIBRA, DIEM, GEMINI DOLLAR, to name a few), digital finance tokens that may be associated with decentralized lending (such as AMP, COMPOUND, PROTOCOL, KYBER, UMA, UNISWAP, YEARN, AAVE, to name a few), tokens, non-fungible token (such as CRYPTOKITTIES, Sorar, Decentraland, Goods Unchained, My Crypto Heroes, to name a few), and/or gaming tokens (such as SANDBOX), to name a few. A non-fungible token is a token which can represent assets like art, collectibles, games, real estate, to name a few, and are considered unique, e.g., no two non-fungible tokens are identical. Non-fungible tokens can also be used in games, such as Sorare—With 100 soccer clubs officially licensed, Sorare lets you purchase NFTs that represent professional soccer players that can be used to play fantasy games against other collectors.

Decentraland—Decentraland is a virtual reality universe similar to The Sims or Second Life. Inhabitants of Decentraland buy, sell, and exchange ERC-721 tokens called LAND and use an ERC-20 token called MANA to purchase other in-universe items. Inside Decentraland, there are art shows, games, and specialized events users can participate in.

Gods Unchained—Gods Unchained is a turn-based collectible card game. NFT cards depict various characters, creatures, events, and powers, which can be used to play one-on-one against an opponent.

My Crypto Heroes—A multiplayer role-playing game, My Crypto Heroes issues NFTs of characters and other in-game items. Players level up their characters through battles and quests.

In embodiments, tokens may be based on standards such as ERC-720, ERC-721, ERC-1155, to name a few.

Figure 41:
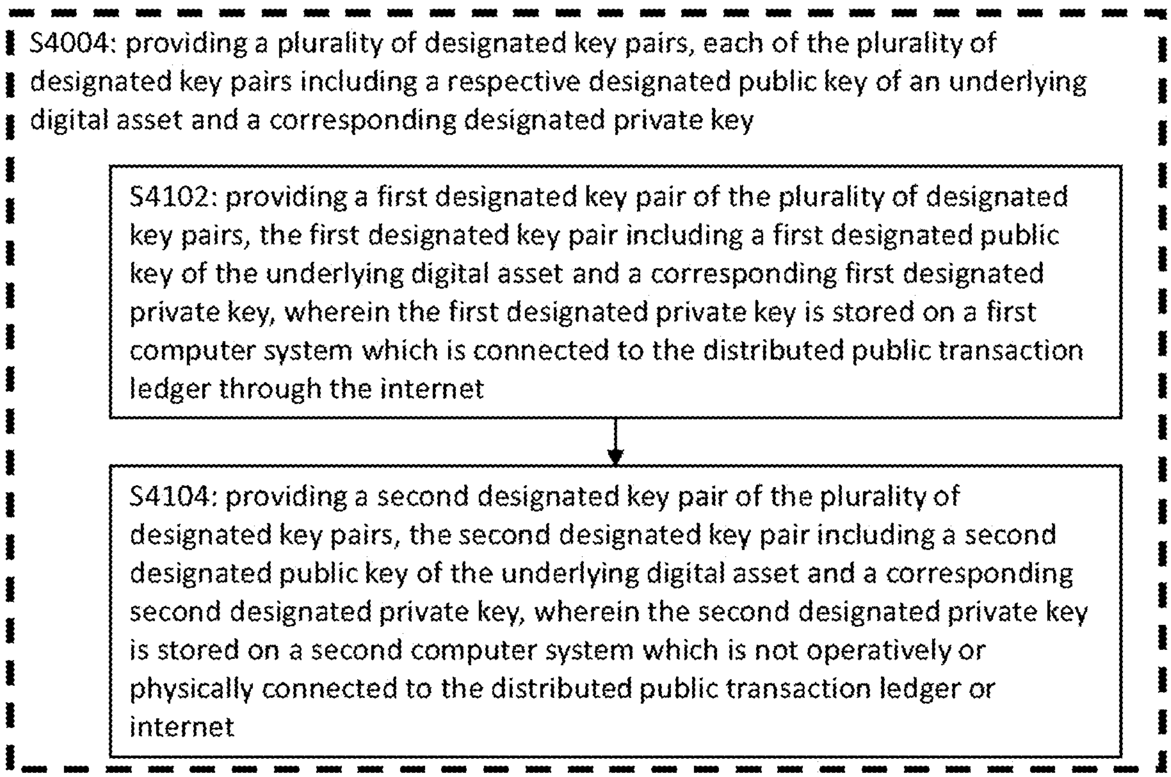
FIG. 41 is a flow chart of a process for providing a plurality of designated key pairs in accordance with exemplary embodiments of the present invention.

In embodiments, the plurality of designated key pairs may be provided with the process described in connection with FIG. 41. Referring to FIG. 41, a process of providing a plurality of designated key pairs may begin at step S4102. At step S4102, a first designated key pair (e.g., on-line keyset 1 1362) may be provided. In embodiments, the first designated key pair may include a first designated public key and a corresponding first designated private key. The first designated public key may be mathematically related to the first designated private key. The first designated public key, in embodiments, may be associated with a first designated public address, which, in embodiments, may be associated with an underlying digital asset. The underlying digital asset (e.g., NEO, ETHER, to name a few) may be maintained on a distributed public transaction ledger maintained in the form of a blockchain. In embodiments, a first computer system may store the first designated private key, similarly with on-line keyset 1 1362. The first computer system may have access to, or be connected with, the distributed public transaction ledger through a network, such as the internet (e.g., network 15). In embodiments, the first designated private key may be mathematically related to the first designated public key. In embodiments, the first designated public address is the first designated public key. In embodiments, the first designated public address is derived from the first designated public key.

In embodiments, the first designated key pair may include a plurality of key pairs (e.g., on-line keyset N 1362N). For example, the first designated key pair may further include a first additional designated public key and a corresponding first additional designated private key. In embodiments, each key pair of the aforementioned plurality of key pairs of the first designated key pair may each correspond to a designated public address. For example, a first key pair of the plurality of key pairs may correspond to a first designated public address associated with the underlying digital asset. Continuing the example, an additional key pair of the plurality of key pairs may correspond to an additional designated public address associated with the underlying digital asset. In embodiments, each key pair of the aforementioned plurality of key pairs may correspond to the same designated public address. For example, the first and additional key pairs mentioned in the examples above may be associated with the same designated public address.

In embodiments, the first designated public address may be derived by using and/or applying a cryptographic hash function of the first designated public key. In embodiments, the first designated public address is a result of the cryptographic hash function, or, in embodiments, at least a part of the result of the cryptographic hash function. A cryptographic hash function may be a hash function that is a mathematical algorithm which maps data of arbitrary size to a bit string of a fixed size (e.g., a hash). In embodiments, the cryptographic hash function may be designed to be a one-way function (e.g., a function that is infeasible to invert). The cryptographic hash function, may include one or more of the following properties: (1) deterministic such that the same message produces results in the same hash; (2) high speed, such that the hash value for a message is computed in a manner that does not slow the process down; (3) infeasible to generate a message from the hash, such that generating a message from the hash value would require attempting all possibilities (e.g., a brute force approach); and (4) unique, such that messages to not have the same hash value and/or small changes to a message alter the hash value such that the values do not correlate, to name a few. In embodiments, and as used herein, algorithm, hash algorithm, hash function, and/or cryptographic hash function may refer to one or more of the following: (1) a mathematical algorithm; (2) a one-way hash function; (3) a cryptographic hash function; (4) a one-way function; (5) a trapdoor one-way function; (6) a Data Encryption Standard encryption algorithm; (7) a Blowfish encryption algorithm; (8) An Advanced Encryption Standard or Rijndael encryption algorithm; (9) a Twofish encryption algorithm; (10) an IDEA encryption algorithm; (11) an MD5 encryption algorithm; (12) an MD4 encryption algorithm; (13) a SHA 1 hashing algorithm; (14) an HMAC hashing algorithm; and/or (15) an RSA Security algorithm, to name a few.

The process of FIG. 41 may continue at step S4104. At step S4104, a second designated key pair (e.g., off-line keyset 1 1803) is provided. The second designated key pair, similar to the first designated key pair, may also include a second designated public key and a corresponding second designated private key. The second designated public key may be mathematically related to the corresponding second designated private key. In embodiments, the second designated key pair may correspond to the same public address as the first designated key pair (e.g., the first designated public address associated with the underlying asset). In embodiments, the second designated key pair may correspond to a different public address than the first designated key pair. For example, the first designated key pair may correspond to the first designated public address and the second designated key pair may correspond to a second designated public address. In embodiments, where the second designated key pair corresponds to a second designated public address, the second designated public address may be the second designated public key.

In embodiments, the second designated key pair may be stored on a second computer system. The second computer system may be physically and/or operationally separated from the first computer system. Additionally, the second computer system may be physically and/or operationally separated (e.g., not connected to) from the distributed public transaction ledger and/or the internet (e.g., network 15). This separation, as described above in connection with FIG. 18A, may be for security purposes, adding an additional layer of security by ensuring that unwanted access is not granted via network 15.

In embodiments, the second computer system may be a hardware security module. The hardware security module may be located in a vault (e.g., Vault 70-A1) Location A, Location B, Location C . . . Location N described above in connection with FIGS. 31A-31D. Additionally, a more detailed description of storage, and particularly cold storage, is located above under the "Cold Storage" heading.

In embodiments, the hardware security module, may include one or more types of storage mediums such as any volatile or non-volatile memory, or any removable or non-removable memory implemented in any suitable manner to store the second designated key pair. For example, the second designated key pair may be stored using computer-readable instructions, data structures, and/or program systems. Various types of storage/memory may include, but are not limited to, hard drives, solid state drives, flash memory, permanent memory (e.g., ROM), electronically erasable programmable read-only memory ("EEPROM"), CD-ROM, digital versatile disk ("DVD") or other optical storage medium, magnetic cassettes, magnetic tape, magnetic disk storage or other magnetic storage devices, RAID storage systems, or any other storage type, or any combination thereof, to name a few.

In embodiments, the second designated key pair may include a plurality of key pairs (e.g., off-line keyset N 1803N). For example, the second designated key pair may further include a first additional designated public key and a corresponding first additional designated private key. In embodiments, each key pair of the aforementioned plurality of key pairs of the second designated key pair may each correspond to a designated public address. For example, a first key pair of the plurality of key pairs may correspond to a first designated public address associated with the underlying digital asset. A second key pair of the plurality of key pairs may correspond to a second designated public address associated with the underlying digital asset. In embodiments, each key pair of the aforementioned plurality of key pairs may correspond to the same designated public address. For example, the first and second key pairs mentioned in the examples above may be associated with the same designated public address.

In embodiments, the second designated public address may be derived by using and/or applying a cryptographic hash function of the second designated public key. In embodiments, the second designated public address is a result of the cryptographic hash function, or, in embodiments, at least a part of the result of the cryptographic hash function. The cryptographic hash function applied may be similar and/or the same cryptographic hash function applied to the first designated key pair. In embodiments, the cryptographic hash function applied to the second designated key pair may be different than the cryptographic hash function applied to the first key pair. A different cryptographic hash function may be used, in embodiments, as an additional security measure.

Referring back to FIG. 40A, the process for withdrawing digital assets may continue at step S4006. At step S4006, a plurality of smart contract instructions is provided. Each of the plurality of smart contract instructions, in embodiments, may be associated with a respective smart contract address associated with the underlying digital asset. In embodiments, the plurality of smart contract instructions may be provided with the process described in connection with FIG. 42.

Figure 42:
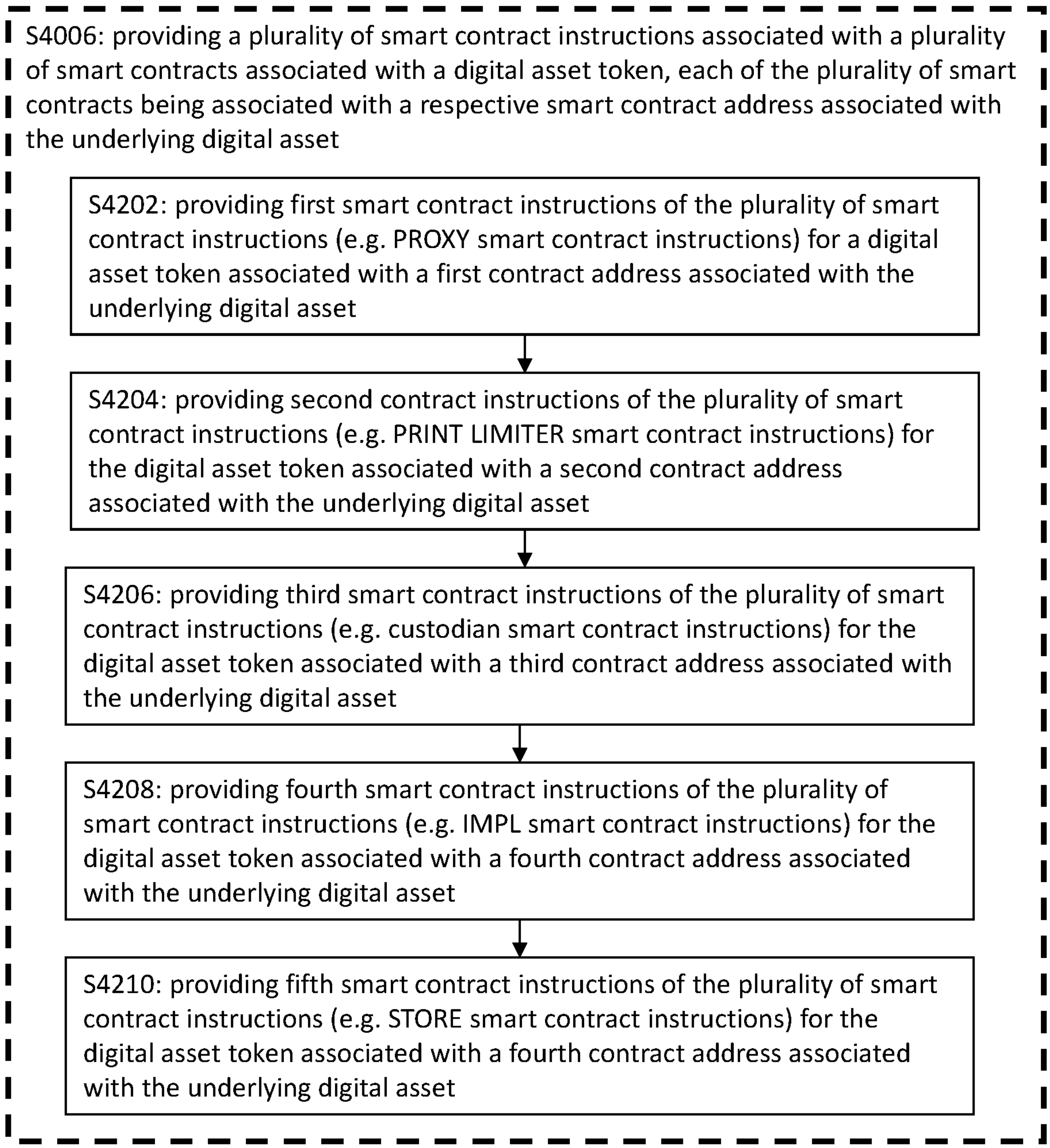
FIG. 42 is a flow chart of a process for providing a plurality of smart contract instructions in accordance with exemplary embodiments of the present invention.

Referring to FIG. 42, a process of providing a plurality of smart contract instructions may begin at step S4202. At step S4202, first smart contract instructions (e.g., PROXY Contract Instructions 1310A-1) associated with a first smart contract (e.g., PROXY Smart Contract 1310) are provided. The first smart contract may have a corresponding first contract address (e.g., Contract Address 1 of Proxy Smart Contract 1310) associated with the blockchain of the underlying digital asset. In embodiments, the first smart contract instructions may be saved as part of the blockchain of the underlying digital asset and/or include one or more of the following instructions: (1) first delegation instructions and/or (2) first authorization instructions, to name a few. The first delegation instructions may delegate one or more first functions associated with the digital asset token to one or more delegated contract addresses associated with the blockchain of the underlying digital asset. The one or more delegated contract addresses, in embodiments, may be different than the first contract address. For example, the one or more delegated contract addresses may include a second contract address, which may be different than the first contract address. The first delegation instructions may similar to the delegation instructions described above in connection with PROXY Delegation Instructions Module 1829.

The first authorization instructions, in embodiments, may be associated with the second designated key pair. In embodiments, first authorization instructions may be similar to the authorization instructions described above in connection with PROXY Authorization Instructions Module 1831.

In embodiments, the first smart contract may be PROXY smart contract 1310 described above in connection with FIGS. 18A and 18B, the description of which applying herein.

The process or FIG. 42 may continue with step S4204 where second smart contract instructions (e.g., PRINT LIMITER Contract Instructions 1360A-1) associated with a second smart contract (e.g., PRINT LIMITER Smart Contract 1360) is provided. The second smart contract may be associated with a second contract address (e.g., Contract Address 3 described above in connection with the PRINT LIMITER Smart Contract 1360) associated with the blockchain of the underlying digital asset. The second smart contract instructions may be saved as part of the blockchain for the underlying digital asset and/or include one or more of the following instructions: (1) print limiter token creation instructions, (2) second authorization instructions, and/or (3) third authorization instructions, to name a few.

The print limiter token creation instructions, in embodiments, may indicate one or more conditions under which digital asset tokens of the underlying digital asset are created. In embodiments, the print limiter token creation instructions may be similar to the PRINT LIMITER token creation instructions described above in connection with the PRINT LIMITER Token Creation Instructions Module 1833.

The second authorization instructions, in embodiments, may include instructions to create tokens of the digital asset token. In embodiments, the first designated key pair is designated to authorize the second authorization instructions. In embodiments, the second designated key pair is designated to authorize the second authorization instructions. The second authorization instructions, in embodiments, may include instructions limiting the creation of digital asset tokens. The limitation placed on token creation may prevent the creation of tokens above a first threshold. For example, the second authorization instructions may limit the creation of tokens to 100,000 tokens. In embodiments, the first threshold may be relative to a first period of time. For example, the second authorization instructions may limit the creation of tokens to 500,000 tokens per day. In embodiments, the second authorization instructions may be similar to the first authorization instructions described above in connection with PRINT LIMITER First Authorization Instructions Module 1839.

The third authorization instructions, in embodiments, may also include instructions with respect to token creation. In embodiments, the third authorization instructions may designate a first designated custodian address (e.g., a custodian address associated with CUSTODIAN 2 Smart Contract 1350) with respect to token creation of the digital asset token. In embodiments, the third authorization instructions may be similar to the second authorization instructions described above in connection with PRINT LIMITER Second Authorization Instructions Module 1841.

In embodiments, the second smart contract instructions may also include token balance modification instructions (e.g., instructions of the Token Balance Modification Instructions Module 1847). The token balance modification instructions may be related to modifying the total balance of tokens of the digital asset token assigned to a third delegated contract address. In embodiments, the third delegated contract address may be of the one or more delegated contracted addresses. In embodiments, the token balance modification instructions may be similar to the optional token balance modification instructions described above in connection with Token Balance Modification Instructions Module 1847.

In embodiments, the second smart contract may further include additional authorization instructions. The additional authorization instructions may be similar to the optional PRINT LIMITER THIRD Authorization instructions described above in connection with PRINT LIMITER Third Authorization Instructions Module 1835.

In embodiments, the second smart contract may be PRINT LIMITER Smart Contract 1360 described above in connection with FIGS. 18A and 18C, the description of which applying herein.

In embodiments, the process of FIG. 42 may continue with step S4206 where third smart contract instructions (e.g., CUSTODIAN 2 Contract Instructions 1350A-1) associated with a first designated custodian contract (e.g., CUSTODIAN 2 Smart Contract 1350). In embodiments, the first designated custodian contract is associated with a third contract address (e.g., Contract Address 6 of CUSTODIAN 2 Smart Contract 1350) associated with the blockchain of the underlying digital asset. In embodiments, the third contract address is the first designated contract address designated by the third authorization instructions of the second smart contract. In embodiments, the third smart contract instructions are saved as part of the blockchain of the underlying digital asset and/or include one or more of the following instructions: (1) fourth authorization instructions (e.g., authorization instructions described in connection with CUSTODIAN 2 First Authorization Instructions Module 1849), and/or (2) sixth authorization instructions (e.g., authorization instructions described in connection with CUSTODIAN 2 Second Authorization Instructions Module 1851), to name a few.

The fourth authorization instructions, in embodiments, may authorize the issuance of instructions to the second smart contract. The issued instructions that are authorized by the fourth authorization instructions may regard token creation. In embodiments, the fourth authorization instructions designate the second designated key pair to authorize the fourth authorization instructions. In embodiments, the fourth authorization instructions designate the first key pair to authorize the fourth authorization instructions. In embodiments, the fourth authorization instructions include instructions to permit the creation of digital asset tokens above a first threshold defined by the second authorization instructions. In embodiments, the fourth authorization instructions may be similar to the authorization instructions described in connection with CUSTODIAN 2 First Authorization Instructions Module 1849.

The sixth authorization instructions, in embodiments, may designate a seventh contract address as one of the one or more delegated contract addresses. In embodiments, the seventh contract address is not the second contract address. In embodiments, the second designated key pair is designated to authorize the sixth authorization instructions. In embodiments, the first designated key pair is designated to authorize the sixth authorization instructions. In embodiments, the sixth authorization instructions may be similar to the authorization instructions described in connection with CUSTODIAN 2 Second Authorization Instructions Module 1851.

In embodiments, the third smart contract may be CUSTODIAN 2 Smart Contract 1350 described above in connection with FIGS. 18A and 18D, the description of which applying herein.

In embodiments, the process of FIG. 42 may continue with step S4208 where fourth smart contract instructions (e.g., IMPL Smart Contract Instructions 1320A-1) associated with a fourth smart contract (e.g., IMPL Smart Contract 1320). In embodiments, the fourth smart contract is associated with a fourth contract address (e.g., Contract Address 2 of IMPL Smart Contract 1320), to name a few. The fourth contract address, in embodiments, may be one of the one or more delegated contract address. Additionally, the fourth contract address, in embodiments, may be different from one or more of: the first contract address, the second contract address, and/or the third contract address (and the below mentioned fifth contract address). The fourth smart contract instructions may be saved as part of the blockchain and/or include one or more of the following instructions: (1) token creation instructions (e.g., instructions of IMPL Token Creation Instructions Module 1865), (2) second delegation instructions (e.g., instructions of IMPL Delegation Instructions Module 1837), (3) token transfer instructions (e.g., instructions of IMPL Token Transfer Instructions Module 1861), and/or (4) token destruction instructions.

The token creation instructions may, in embodiments, be instructions to create tokens of the digital asset tokens. In embodiments, the token creation instructions may create tokens in accordance with the conditions set forth by the print limiter token creation instructions of the second smart contract. The token creation instructions may be similar to instructions described in connection with the IMPL Token Creation Instructions Module 1865.

The second delegation instructions, in embodiments, may delegate data storage operations to at least a fifth contract address. In embodiments, the fifth contract address may be associated with Contract Address 4 of STORE Smart Contract 1330. For example, the second delegation instructions may cause STORE Smart Contract 1330 to execute storage instructions of Storage Instructions Module 1853. The second delegation instructions may be similar to instructions described in connection with IMPL Delegation Instructions Module 1861.

In embodiments, the token transfer instructions may be related to transferring issued tokens of the digital asset token. The transfer of tokens may be from a first designated contract address to a second designated contract address. For example, issued tokens may be transferred from a contract address associated with a digital asset token issuer system to a user public address associated with a user attempting to purchase tokens of the underlying digital asset. The token transfer instructions may be similar to instructions described in connection with IMPL Token Transfer Instructions Module 1859.

In embodiments, the token destruction instructions may be related to destroying and/or burning one or more issued tokens of the digital asset token. For example, if a user is attempting to exchange a token for, as an example, fiat, the token being exchanged may be burned once the token is exchanged for fiat.

In embodiments, the fourth smart contract may be IMPL Smart Contract 1320 described above in connection with FIGS. 18A and 18F, the description of which applying herein.

In embodiments, the process of FIG. 42 may continue with step S4210 where fifth smart contract instructions (e.g., STORE Contract Instructions 1330A-1) associated with a fifth smart contract (e.g., STORE Smart Contract 1330) are provided. The fifth contract address, in embodiments, may be one of one or more designated store contract addresses. In embodiments, the fifth smart contract instructions may be saved as part of the blockchain of the underlying digital asset and/or include one or more of the following instructions: (1) data storage instructions (e.g., instructions of Storage Instructions Module 1853) and/or (2) fifth authorization instructions (e.g., instructions of STORE Authorization Instructions Module 1855), to name a few.

The data storage instructions, in embodiments, may include instructions to store transaction data related to the digital asset token. Transaction data, in embodiments, may include transaction information for one or more of the issued tokens of the digital asset token. The transaction information may include at least one of: (1) respective public address information associated with the blockchain of the underlying digital asset, and/or (2) corresponding respective token balance information which may be associated with the aforementioned respective public address information, to name a few. In embodiments, the transaction data may include transaction information for all of the issued tokens of the digital asset token. In embodiments, the data storage instructions may be similar to instructions described in connection with Storage Instructions Module 1853.

The fifth authorization instructions may include authorization instructions to modify the transaction data in response to a request. In embodiments, the request may be received from the fourth contract address. The fifth authorization instructions may be similar to instructions described above in connection with STORE Authorization Instructions 1855.

In embodiments, the fifth smart contract may be STORE Smart Contract 1330 described above in connection with FIGS. 18A and 18E, the description of which applying herein.

Referring back to FIG. 40A, the process of withdrawing digital assets may continue with step S4008. At step S4008, a list of designated public addresses is obtained by the digital asset exchange computer system associated with a digital asset exchange. In embodiments, the list of designated public addresses may include one or more designated public addresses. Each of the one or more designated public addresses, in embodiments, may also include a respective amount of digital assets. The respective amount of digital assets may refer to an amount of digital assets that the respective designated public address is requesting to withdraw. A simplified, exemplary list of designated public addresses is shown below as Table 1.

TABLE 1

| Designated Public Address | Digital Asset Type | Digital Asset Amount | Timestamp |
|---|---|---|---|
| 123456 | Gemini Dollar | 45 | T1 |
| 543456 | Gemini Dollar | 65 | T1 |
| 654692 | Gemini Dollar | 24 | T2 |
| 687128 | Gemini Dollar | 17 | T2 |
| 357981 | Gemini Dollar | 8 | T1 |
| 354651 | Gemini Dollar | 104 | T3 |

In embodiments, the list of designated public addresses may include one or more of the following: a designated public address, a digital asset type, a digital asset amount, and/or a timestamp, to name a few. The digital asset type may refer to the type of digital asset the customer is seeking to withdraw. While only one type of digital asset is shown in Table 1 (Gemini Dollar), one or more types of digital assets may be included in a list of designated public addresses. The timestamp, in embodiments, may refer to the time at which: (1) the customer sent the request for withdrawal; (2) the customer's request was received; (3) the customer would like to receive their withdrawal; and/or (4) a combination thereof, to name a few.

In embodiments, the process of obtaining a list of designated public addresses may be accomplished in one or more manners. For example, the digital asset exchange computer system may receive a plurality of requests to withdraw an amount of digital asset tokens. In embodiments, each request may include a designated public address, a digital asset type, a digital asset amount, and/or a timestamp, to name a few. Once the plurality of requests is received, the digital asset exchange computer system may generate and store the list of designated public addresses.

As another example, to obtain the list of designated public addresses, the digital asset exchange computer system may first receive a request to distribute a payment amount to one or more designated public addresses in exchange for an asset. The asset, having a corresponding value, as described herein, may not be the digital asset token and/or may be one or more of the following: stocks, bonds, equities, fixed-income securities, flat, commodities, and/or marketable securities, to name a few. For example, the request to withdraw may be in the form of a request to pay stockholders a dividend based on the amount of stocks the stockholder owns. The request to distribute a payment amount may be received from a digital asset issuer (e.g., the digital asset token issuer system described above in connection with FIGS. 20A-20C, the description of which applying herein). In embodiments, the request to distribute a payment amount may include one or more of: payment information, one or more designated public addresses, a digital asset type associated with a respective designated public address, a digital asset amount associated with a respective designated public address, and/or a timestamp associated with a respective designated public address, to name a few.

In embodiments, continuing the example, the digital asset exchange computer system may access a digital asset security token database for the purposes of determining each respective designated public address of the one or more designated public addresses and/or a respective digital asset security token amount associated with each respective designated public address. In embodiments, the digital asset security token may be a digital asset that represents the asset. For example, if a user associated with a designated public address owns 50 stocks of Corporation A, the user may also own a corresponding 50 Security Tokens representing the ownership of 50 stocks.

Continuing the example, the digital asset exchange computer system may determine the amount of the digital asset that corresponds to the amount of digital asset security tokens. In embodiments, to determine the amount of digital asset, the digital asset exchange computer system may determine the values of the digital asset and the digital asset security token. After determining the values of the digital asset and the digital asset security token, the digital asset exchange computer system may determine a difference between the two values. The difference between the two values, along with the two values, may be used to determine a respective amount of digital assets that each designated public address is requesting. The respective amount, in embodiments, may be assigned to the respective designated public address, creating the list of designated public addresses. The list of designated public addresses may be stored by the digital asset exchange computer system on memory operably connected to the digital asset exchange computer system.

Continuing the process of withdrawing digital assets, optionally, in embodiments, at step S4010, the digital asset exchange computer system may verify the list of designated public addresses. The verification process, in embodiments, may be based on one or more whitelists associated with one or more of the designated public addresses. The digital asset exchange computer system, in embodiments, may verify that each designated public address is verified. In embodiments, the digital asset exchange computer system may verify only the designated public addresses that have one or more whitelists associated therewith.

In embodiments, the one or more designated public addresses may be verified by the process described in connection with FIG. 45. Referring to FIG. 45, the process of verification may begin at step S4502. At step S4502, the digital asset exchange computer system accesses the user identification data associated with each customer of the plurality of customers of the digital asset exchange. In embodiments, at step S4504, the digital asset exchange computer system may determine, for each customer, whether the user identification data includes a whitelist associated with the customer's respective account. If there are no whitelists associated with a customer, the process may continue with FIG. 40B (described below).

If one or more whitelists associated with one or more customers, the process may continue with Step S4506. At step S4506, the digital asset exchange computer system may access the one or more whitelists. The one or more whitelists may include one or more authorized public addresses, as described above. The one or more whitelists may be accessed and/or obtained to determine, at step S4508, whether each respective one or more authorized public addresses is the respective designated public address associated with the customer seeking to withdraw digital assets. In embodiments, the digital asset exchange computer system may make the aforementioned determination by comparing the one or more authorized public addresses to the designated public addresses. If the designated public addresses, in embodiments, match at least one of the one or more authorized public addresses, the designated public address may be verified as an authorized public address. In embodiments, if the designated public addresses are authorized, and therefore verified, the process for withdrawing digital assets may continue with FIG. 40B (continued and described below). If, in embodiments, the designated public addresses are not authorized (or at least one designated public address is not authorized), the process for withdrawing digital assets may continue with FIG. 40C (continued and described below).

Referring to FIG. 40B, the process for withdrawing digital assets may continue with step S4012. At step S4012, the digital asset exchange computer system may increase the total supply of the digital asset token from a first amount to a second amount. The first amount, in embodiments, may refer to the total supply of the digital asset token prior to obtaining the list of designated public addresses. The second amount, in embodiments, may refer to an increased amount of the total supply of the digital asset token. In embodiments, the difference between the second amount and the first amount is equal to or greater than the total amount of digital asset token requested by the designated public addresses of the list of designated public addresses. For example, the first amount of digital asset token may be 100 BITCOIN. Continuing the example, the designated public addresses may have requested 50 BITCOIN. Thus, in this example, the second amount, to account for the amount requested by the designated public addresses, may be at least 150 BITCOINs, making the difference (e.g., a third amount of digital asset tokens), to be at least 50 BITCOIN (e.g., the amount requested). A more detailed description of the process of step S4012 is located in the flowcharts of FIGS. 43A-43B and/or FIG. 44.

In embodiments, increasing the supply of digital asset tokens may begin with the digital asset exchange computer system determining whether the first designated private key has the authority to increase the total supply by the amount requested by the designated public addresses. As mentioned above, the plurality of smart contract instructions may limit the total amount of digital assets that the first designated key pair has the authority to generate. For example, the first designated key pair may only have the authority to generate 25 BITCOIN. Thus, continuing the example, if the third amount is 50 BITCOIN, the first designated key pair would not have the authority to generate the third amount. If the first designated key pair does not have the authority to generate the third amount, the process for withdrawing digital assets, in embodiments, may continue with FIGS. 43A-43B. As another example, if the first designated key pair has the authority to generate 100 BITCOIN, in embodiments, the first designated key pair would have the authority to generate 50 BITCOIN (e.g., the third amount). If the first designated key pair does have the authority to generate the third amount, the process for withdrawing digital assets, in embodiments, may continue with FIG. 44.

Figure 43A:
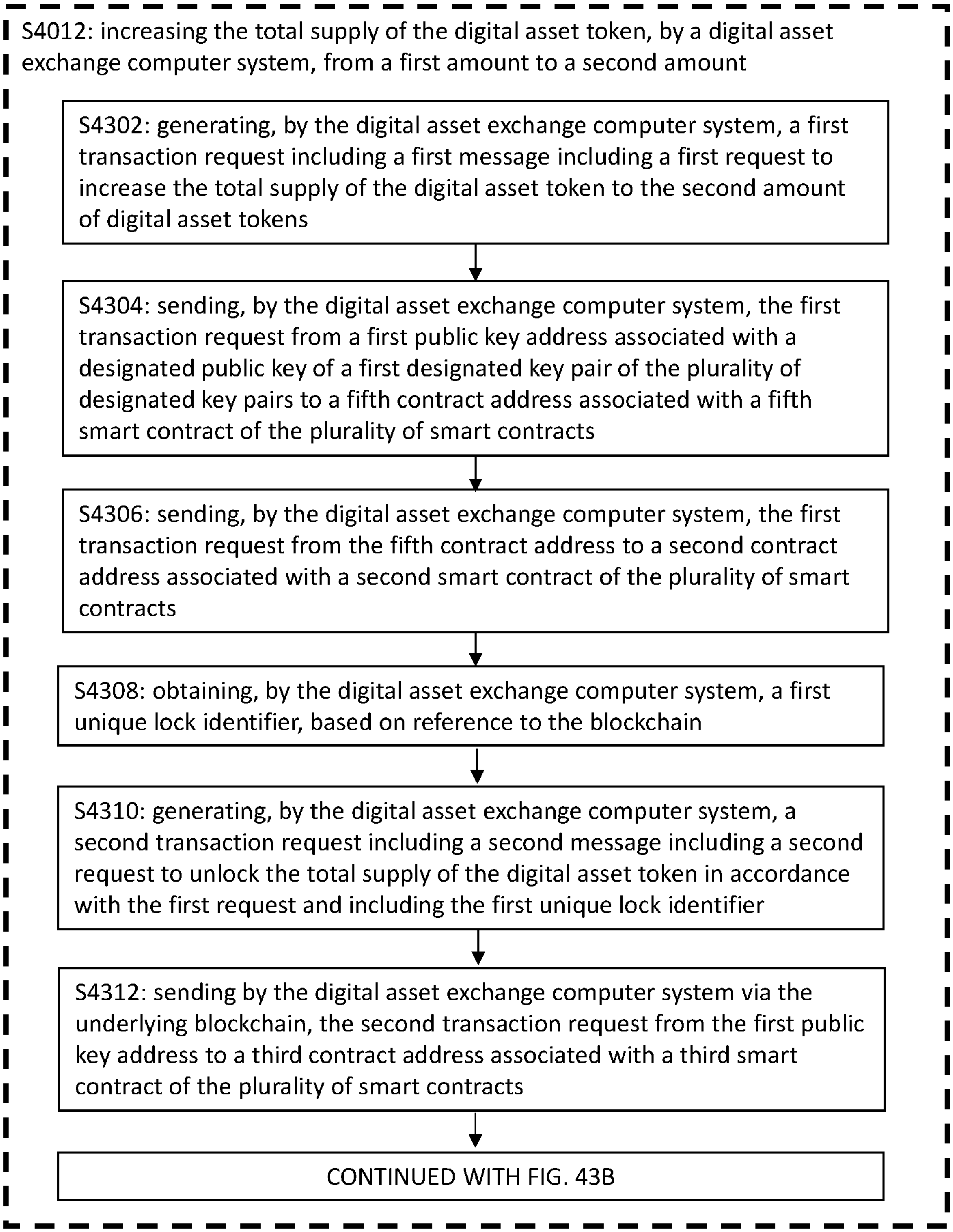
FIGS. 43A-43B are flow charts of processes for increasing a total supply of digital asset tokens in accordance with exemplary embodiments of the present invention.

Referring to FIG. 43A, the process of increasing the total supply of digital asset tokens may begin with step S4302 where a first transaction request may be generated by the digital asset exchange computer system. The first transaction request may include a first message that may include a first request to increase the total supply of digital asset tokens to the second amount of digital asset tokens. In embodiments, the first transaction request may be sent from a contract address associated with the digital asset token issuer system to the fourth contract address. In embodiments, the first transaction request may be digitally signed by the first designated private key and/or second designated private key. In embodiments, the first transaction request may include first transaction fee information for miners associated with the plurality of geographically distributed computer systems in the peer-to-peer network. The first transaction fee information may be a predetermined amount of currency which may be related to the cost of processing the first transaction request.

In embodiments, the first request may be to decrease the total supply of digital asset tokens to a third amount. This example may follow the same process described in connection with FIGS. 43A-43B and/or FIG. 44, with the third amount of digital asset tokens being less than the first amount of digital asset tokens.

The process of increasing the total supply of the digital asset token may continue with step S4304. In embodiments, at step S4304, the first transaction request may be sent by the digital asset token issuer system from the first designated public address to the fifth contract address. In embodiments, the first transaction request may be sent via the blockchain of the underlying digital asset. In embodiments, the first transaction request may be sent via network 15.

The process for increasing the total supply of the digital asset token may continue with step S4306 where the first transaction request may be sent from the fifth contract address to the second contract address via the blockchain for the underlying digital asset. The first transaction request, in embodiments, may be sent to the second contract address by the fifth contract address in response to the fifth contract address receiving the first transaction request. In embodiments, the first transaction request may be sent by the fifth contract address in response to the fifth contract address determining that the first transaction request requires additional authority. The aforementioned determination, in embodiments, may be made based on the plurality of smart contract instructions.

In embodiments, once the first transaction request is received by the second contract address, the second smart contract may execute the first transaction request. The execution of the first transaction request may, in embodiments, cause the second contract address to return a first unique lock identifier associated with the first transaction request to the digital asset exchange computer system (e.g., via a public address associated with the digital asset exchange). In embodiments, the first transaction request is executed via the plurality of geographically distributed computer systems in the peer-to-peer network with reference to the blockchain for the underlying digital asset.

In embodiments, the process may continue with step S4308, where the digital asset exchange computer system may obtain the first unique lock identifier. The first lock identifier, as mentioned above, may be obtained from the second smart contract address via a public address associated with the digital asset exchange (e.g., the public address associated with the first designated public key). In embodiments, the first unique lock identifier may be obtained based on reference to the blockchain for the underlying digital asset.

In embodiments, the process for increasing the total supply of the digital asset may continue with step S4310 where a second transaction request may be generated by the digital asset exchange computer system. In embodiments, the second transaction request may be generated in response to the first unique lock identifier being obtained. In embodiments, the second transaction request may be generated at the same time and/or substantially the same time that the first transaction request is generated. The second transaction request may, in embodiments, include a second message which may include a second request to unlock the total supply of the digital asset tokens. The second request may be in accordance with the first request. In embodiments, the second request, may also include the first unique lock identifier. In embodiments, the second transaction request may be digitally signed by the first designated private key and/or the second designated private key. In embodiments, the second transaction request may include second transaction fee information for miners associated with the plurality of geographically distributed computer systems in the peer-to-peer network. The second transaction fee information may be a predetermined amount of currency which may be related to the cost of processing the second transaction request.

The process may continue with step S4312 where the second transaction request may be sent from the first designated public address (the public address associated with the first designated public key) to the third contract address by the digital asset exchange computer system via the blockchain for the underlying digital asset. In embodiments, in response to receiving the second transaction request, the third smart contract may execute the second transaction request. Executing the second transaction request, in embodiments, may include returning a first unique request hash associated with the second transaction request to the first designated public address. The first unique request hash, in embodiments, may be an algorithm as described above, the description of which applying herein. In embodiments, the second transaction request may be executed via the plurality of geographically distributed computer systems in the peer-to-peer network with reference to the blockchain associated with the underlying digital asset.

Figure 43B:
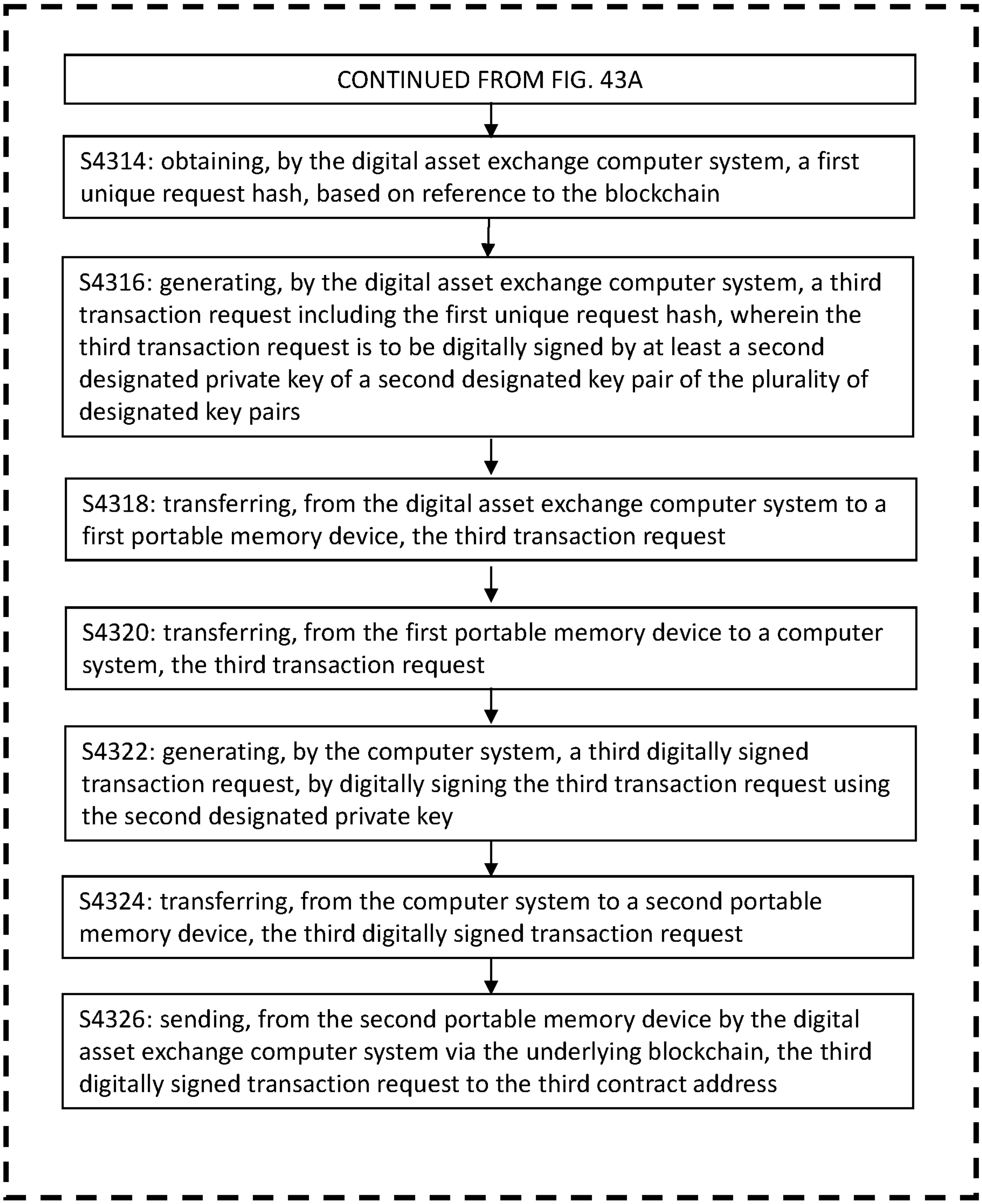

The process for increasing the total supply of the digital asset token may continue with FIG. 43B. Referring to FIG. 43B, the process may continue with step S4314 where, in embodiments, the first unique request hash may be obtained by the digital asset exchange computer system. The first unique request hash, as mentioned above, may be obtained from the third smart contract address via a public address associated with the digital asset exchange (e.g., the public address associated with the first designated public key—the first designated public address). In embodiments, the first unique request hash may be obtained based on reference to the blockchain for the underlying digital asset.

Continuing the process, at step S4316, in embodiments, a third transaction request may be generated by the digital asset exchange computer system. The third transaction request may, in embodiments, be generated to be digitally signed by the first designated private key and/or the second designated private key. In embodiments, the third transaction request may include the first unique request hash. In embodiments, the third transaction request may be generated at the same time and/or substantially the same time that the first transaction request and/or second transaction request is generated. The third transaction request, in embodiments, may be generated in response to the digital asset token issuer system obtaining the first unique request hash.

In embodiments, at step S4318, the third transaction request may be transferred to a first portable memory device. In embodiments, the third transaction request may be transferred to the first portable memory device by an administrator (e.g., an administrator of administrator system 1801, administrator of the digital asset exchange computer system, to name a few). In embodiments, the third transaction request may be transferred from the digital asset exchange computer system to the first portable memory device. In embodiments, the first portable memory device, may include one or more types of storage mediums such as any volatile or non-volatile memory, or any removable or non-removable memory implemented in any suitable manner to store the third transaction request. For example, the third transaction request may be stored using computer-readable instructions, data structures, and/or program systems. Various types of storage/memory may include, but are not limited to, hard drives, solid state drives, flash memory, permanent memory (e.g., ROM), electronically erasable programmable read-only memory ("EEPROM"), CD-ROM, digital versatile disk ("DVD") or other optical storage medium, magnetic cassettes, magnetic tape, magnetic disk storage or other magnetic storage devices, RAID storage systems, or any other storage type, or any combination thereof, to name a few.

In embodiments, the process may continue with step S4320 where the third transaction request may be transferred from the first portable memory device to a first computer system. The first computer system, as mentioned above, may be a hardware security module. In embodiments, the third transaction request may be transferred to the second computer system by an administrator (e.g., an administrator of administrator system 1801, administrator of the digital asset exchange computer system, to name a few).

At step S4322, in embodiments, the computer system may generate a third digitally signed transaction request by digitally signing the third transaction request. The digital signature used by the computer system, in embodiments, may be one or more of: the first designated private key and/or the second designated private key. In embodiments, the digital signature may be a private key of the plurality of designated key pairs provided in step S4004.

In embodiments, once the third digitally signed transaction request is generated, at step S4324, the third digitally signed transaction request may be transferred from the computer system to a second portable memory device. The second portable memory device may, in embodiments, be the first portable memory device (e.g., the first and second portable memory device are the same portable memory device). In embodiments, the second portable memory device may be physically and operatively separate from the first portable memory device. In embodiments, the second portable memory device, may include one or more types of storage mediums such as any volatile or non-volatile memory, or any removable or non-removable memory implemented in any suitable manner to store the third transaction request. For example, the third transaction request may be stored using computer-readable instructions, data structures, and/or program systems. Various types of storage/memory may include, but are not limited to, hard drives, solid state drives, flash memory, permanent memory (e.g., ROM), electronically erasable programmable read-only memory ("EEPROM"), CD-ROM, digital versatile disk ("DVD") or other optical storage medium, magnetic cassettes, magnetic tape, magnetic disk storage or other magnetic storage devices, RAID storage systems, or any other storage type, or any combination thereof, to name a few.

In embodiments, the process for increasing the total supply of the digital asset may continue with step S4326 where the third digitally signed transaction request may be sent from the second portable memory device to the third contract address using the digital asset exchange computer issuer system, via the blockchain for the underlying digital asset. To send the third digitally signed transaction request, in embodiments, the third digitally signed transaction request may be first transferred from the second portable memory device to the digital asset exchange computer system. Once transferred, in embodiments, the third digitally signed transaction request may be sent by the digital asset exchange computer system, from the first designated public address (associated with the first designated key pair) to the third contract address.

In response to receiving the third digitally signed transaction request, in embodiments, the third smart contract may execute the third digitally signed transaction request. In embodiments, the execution of the third digitally signed transaction request may result in a request to validate the second request to unlock the total supply of digital asset tokens based on the third digitally signed transaction request and/or the first unique request hash. In embodiments, the execution may also result in a first call being sent to the second contract address. The first call may be to increase the total supply of the digital asset tokens from the first amount to the second amount. In embodiments, the third smart contract may execute the third digitally signed transaction request via the plurality of geographically distributed computer systems in the peer-to-peer network with reference to the blockchain of the underlying digital asset.

The first call sent by the third smart contract to the second contract address of the second smart contract may, in embodiments, result in the second contract address returning the first call to the fourth contract address. The fourth contract address may, in response to receiving the returned first call, execute a second call to the fifth contract address. The second call, in embodiments, may be to set the total supply of the digital asset tokens to the second amount of digital asset tokens. In embodiments, the fourth smart contract may execute the second call via the plurality of geographically distributed computer systems in the peer-to-peer network with reference to the blockchain of the underlying digital asset.

The second call sent by the fourth smart contract to the fifth contract address of the fifth smart contract may, in embodiments, result in the fifth smart contract executing the second call to set the total supply of the digital asset tokens to the second amount of digital asset tokens. In embodiments, the fifth smart contract may execute the second call via the plurality of geographically distributed computer systems in the peer-to-peer network with reference to the blockchain of the underlying digital asset.

In embodiments, the fifth contract address may also return the total balance of the digital asset token to the second contract address and/or the fourth contract address.

In embodiments, the steps of the process described in connection with FIGS. 43A-43B may be rearranged or omitted.

Figure 44:
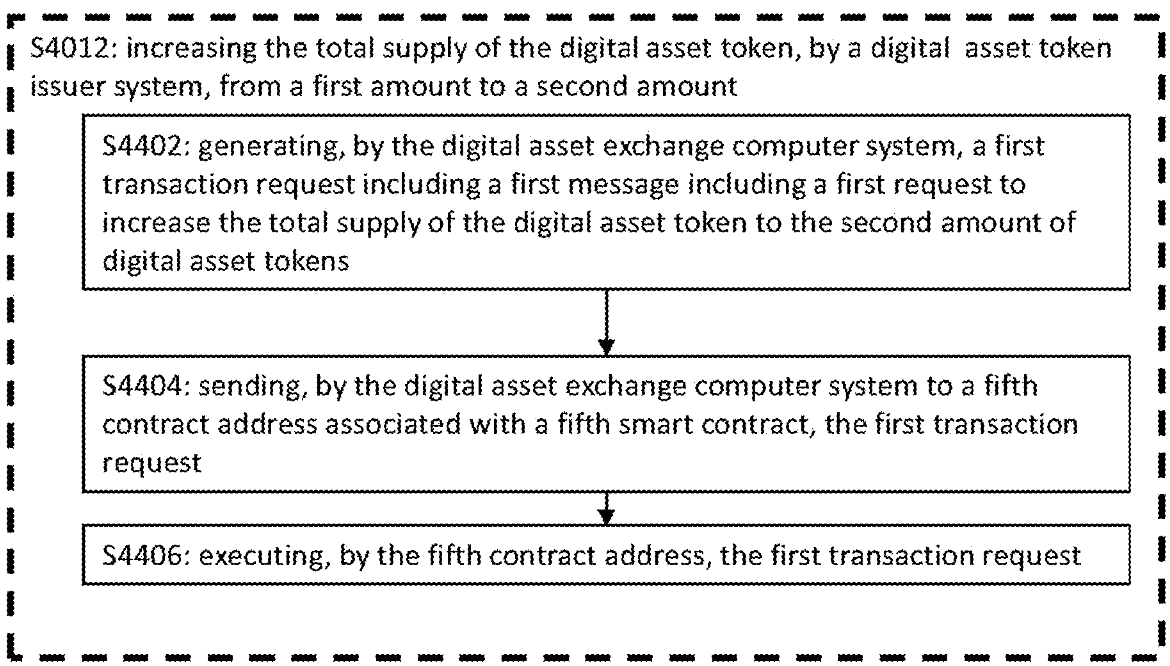
FIG. 44 is a flow chart of a process for increasing a total supply of digital asset tokens in accordance with exemplary embodiments of the present invention.

As another example, a process for increasing the total supply of the digital asset may be performed by the steps of FIG. 44. Referring to FIG. 44, in embodiments, the first designated key pair may have the authority to increase the total amount of the digital asset token to the second amount. In such embodiments, the digital asset exchange may, at step S4402, generate a first transaction request including a first request. The first request may include a request to increase the total supply of the digital asset token to the second amount of digital asset tokens. In embodiments, the first transaction request may be digitally signed by the first designated private key and/or the second designated private key.

The first request may, at step S4404, be sent by the digital asset exchange computer system to the fifth contract address associated with the fifth smart contract. The first request may be sent from a public address associated with the digital asset exchange (e.g., the first designated public address).

Once received, at step S4406, the fifth contract address may execute the first transaction request via the plurality of geographically distributed computer systems in the peer-to-peer network with reference to the blockchain. In embodiments, the execution of the first transaction request may cause the fifth smart contract to: (1) validate the authority of the first designated key pair of the plurality of designated key pairs; and/or (2) send a first call to the fourth smart contract address to generate the third amount of the digital asset. In embodiments, in response to receiving the first call, the fourth smart contract may execute, via the plurality of geographically distributed computer systems in the peer-to-peer network with reference to the blockchain, the first call to generate the first unique lock identifier. In embodiments, once generated, the fourth contract address may send a return including the first unique lock identifier to the second smart contract address.

In embodiments, the second smart contract may execute a second call to the fourth contract address in response to the return of the first unique lock identifier. In embodiments, the second call may be executed via the plurality of geographically distributed computer systems in the peer-to-peer network with reference to the blockchain. The second call, in embodiments, may be to confirm the first call with the first lock identifier. In embodiments, in response to receiving the second call, the fourth smart contract may execute, via the plurality of geographically distributed computer systems in the peer-to-peer network with reference to the blockchain, the first call to execute a third call to the fifth contract address to obtain the total supply of digital asset tokens in circulation.

In embodiments, the fifth contract address, in response, via the plurality of geographically distributed computer systems in the peer-to-peer network with reference to the blockchain, may execute the third call and return, to the fourth contract address, the second amount of digital asset tokens corresponding to the total supply of digital asset tokens in circulation. In embodiments, for example, the total supply of digital asset tokens may be the first amount of the digital asset token.

In response to the return, in embodiments, the fourth smart contract may execute, via the plurality of geographically distributed computer systems in the peer-to-peer network with reference to the blockchain, a fourth call request to the fifth contract address to set a new total supply of digital asset tokens in circulation to the second amount. In embodiments, in response to the fourth call, the fifth smart contract may execute, via the plurality of geographically distributed computer systems in the peer-to-peer network with reference to the blockchain, the fourth call and set the new total supply of digital asset tokens in circulation to the second amount.

In embodiments, the steps of the process described in connection with FIG. 44 may be rearranged or omitted.

Referring back to FIG. 40B, after increasing the total supply of the digital asset token to the second amount, the digital asset exchange computer system at step S4014 may assign each respective amount of the digital asset token to each respective designated public address of the list of designated public addresses. In embodiments, the digital asset exchange computer system may accomplish step S4014 by obtaining and/or accessing the list of designated public addresses. For example, referencing the above Table 1, Table 2 below shows the respective amount of the digital asset to be assigned.

TABLE 2

| Designated Public Address | Digital Asset Type | Digital Asset Amount |
|---|---|---|
| 123456 | Gemini Dollar | 45 |
| 543456 | Gemini Dollar | 65 |

TABLE 2-continued

| Designated Public Address | Digital Asset Type | Digital Asset Amount |
|---|---|---|
| 654692 | Gemini Dollar | 24 |
| 687128 | Gemini Dollar | 17 |
| 357981 | Gemini Dollar | 8 |
| 354651 | Gemini Dollar | 104 |

Once the respective amounts of the digital asset have been assigned, the digital asset exchange computer system, at step S4016, may confirm that each designated public address was assigned the respective amount of the digital asset token. For example, referring to Table 2 above, the digital asset exchange computer system may confirm the following: designated public address 123456 received 45 Gemini Dollars; designated public address 543456 received 65 Gemini Dollars; designated public address 654692 received 24 Gemini Dollars; designated public address 687128 received 17 Gemini Dollars; designated public address 357981 received 8 Gemini Dollars; and/or designated public address 354651 received 104 Gemini Dollars. In embodiments, the digital asset exchange computer system may make the confirmation based on one or more of the following: each respective digital asset security token amount, each respective payment amount, each respective designated public address, and/or the list of designated public addresses, to name a few.

Each respective amount, in embodiments, may be confirmed by the digital asset exchange computer system by sending a call to each designated public address. The call, in embodiments, may be sent from a public address associated with the digital asset exchange. Each designated public address, in embodiments, may return the amount assigned and/or the total amount of digital assets assigned to the respective designated public address. The return may be used by the digital asset exchange computer system to confirm that each respective amount was received. In embodiments, the returns may be stored by the digital asset exchange computer system.

In embodiments, the digital asset token issuer system may determine that each respective amount is not confirmed as received and/or is unable to confirm that each amount is received. For example, the digital asset token issuer system may determine that the designated public address 123456 received 13 Gemini Dollars, instead of 45. In these embodiments, the digital asset exchange computer system may generate and/or send a warning message for an administrator (e.g., an administrator of administrator system 1801) and/or the respective designated public address. In embodiments, the administrator system may be the digital asset exchange. In embodiments, the administrator system may not be the digital asset exchange. The warning message may include a notification stating that the amount of tokens that were assigned is incorrect and/or needs to be fixed. Additionally, the warning message may include a transaction ledger (e.g., Network Digital Asset Transaction Ledger 3228). Furthermore, the warning message may include the intended amount of digital asset tokens (e.g., 45 Gemini Dollars). In embodiments, if the digital asset exchange computer system determines that each respective amount is not confirmed as received and/or is unable to confirm that each amount is received, the digital asset token issuer system may repeat one or more of the steps of the processes described above in connection with FIGS. 43A-43B, and/or FIG. 44 in order to fix the amount of the digital asset token to the correct amount.

In embodiments, as mentioned above, the digital asset exchange computer system may determine that one or more designated public addresses of the list of designated public addresses is not authorized to withdraw digital assets. If one or more designated public addresses are not authorized, the digital asset exchange computer system, in embodiments, may perform the steps of the process illustrated in FIG. 40C. Referring to FIG. 40C, the digital asset exchange computer system, at step S4018, may generate a notification. The notification, in embodiments, may indicate that the respective designated public address cannot be assigned the respective amount of the digital asset. In embodiments, the notification may also include an option to override the security measure to prevent the withdrawal of digital assets to an unverified account. The option to override, in embodiments, may require user identification information, which may include personally identifiable information.

At step S4020, the digital asset exchange computer system may send the notification to a user device associated with the request to withdraw. Additionally, in embodiments, the notification may also be sent to: a third party computer system and/or an administrator associated with the digital asset exchange. The notification, in embodiments, may also be stored by the digital asset exchange computer system.

The digital asset exchange computer system, at step S4022, may cancel the respective request to withdraw the respective amount of digital asset token. Alternatively, if the option to override is utilized, the process may continue with FIG. 40B.

In embodiments, the steps of the process described in connection with FIGS. 40A-40C may be rearranged or omitted.

Figure 9A:
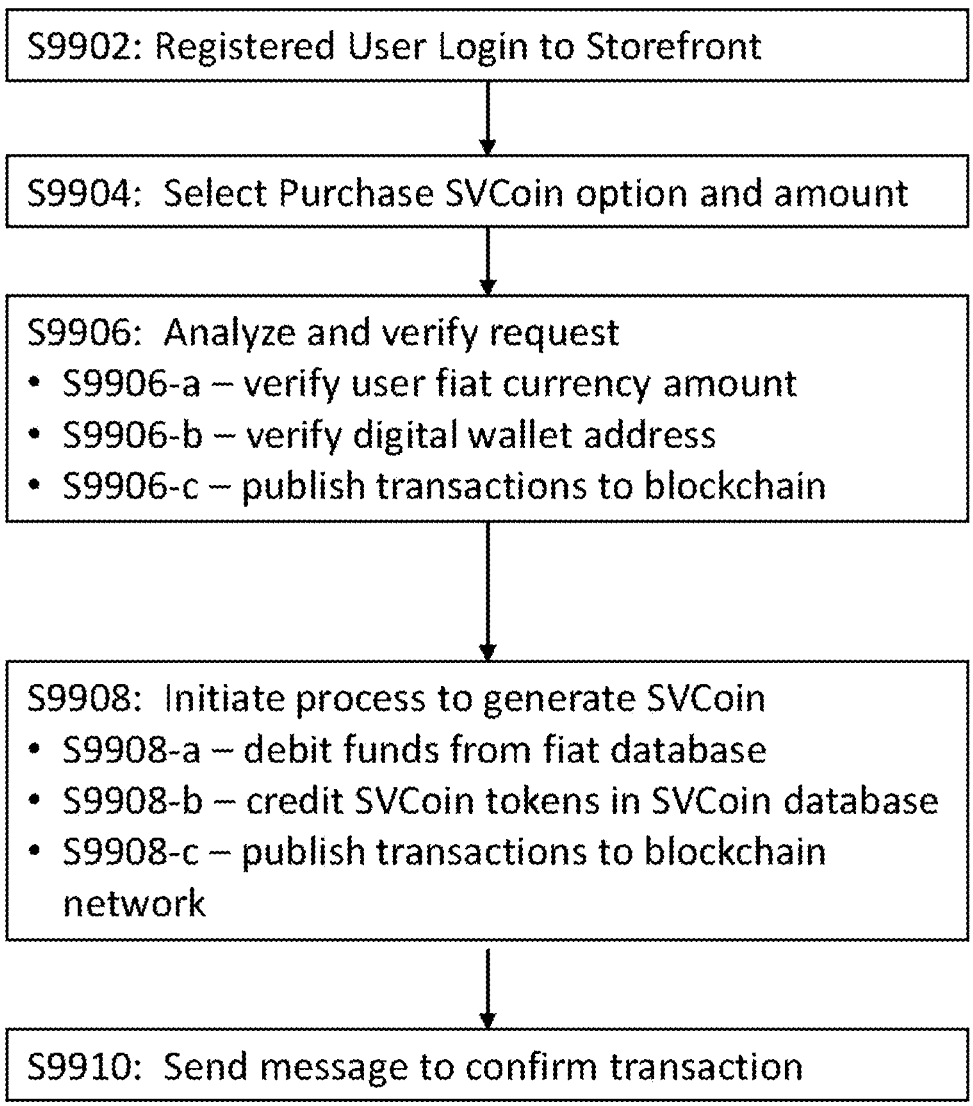
FIG. 9A is an exemplary flow chart of the process for purchasing SVCoin for fiat on a digital asset exchange in accordance with exemplary embodiments of the present invention.
Figure 9B:
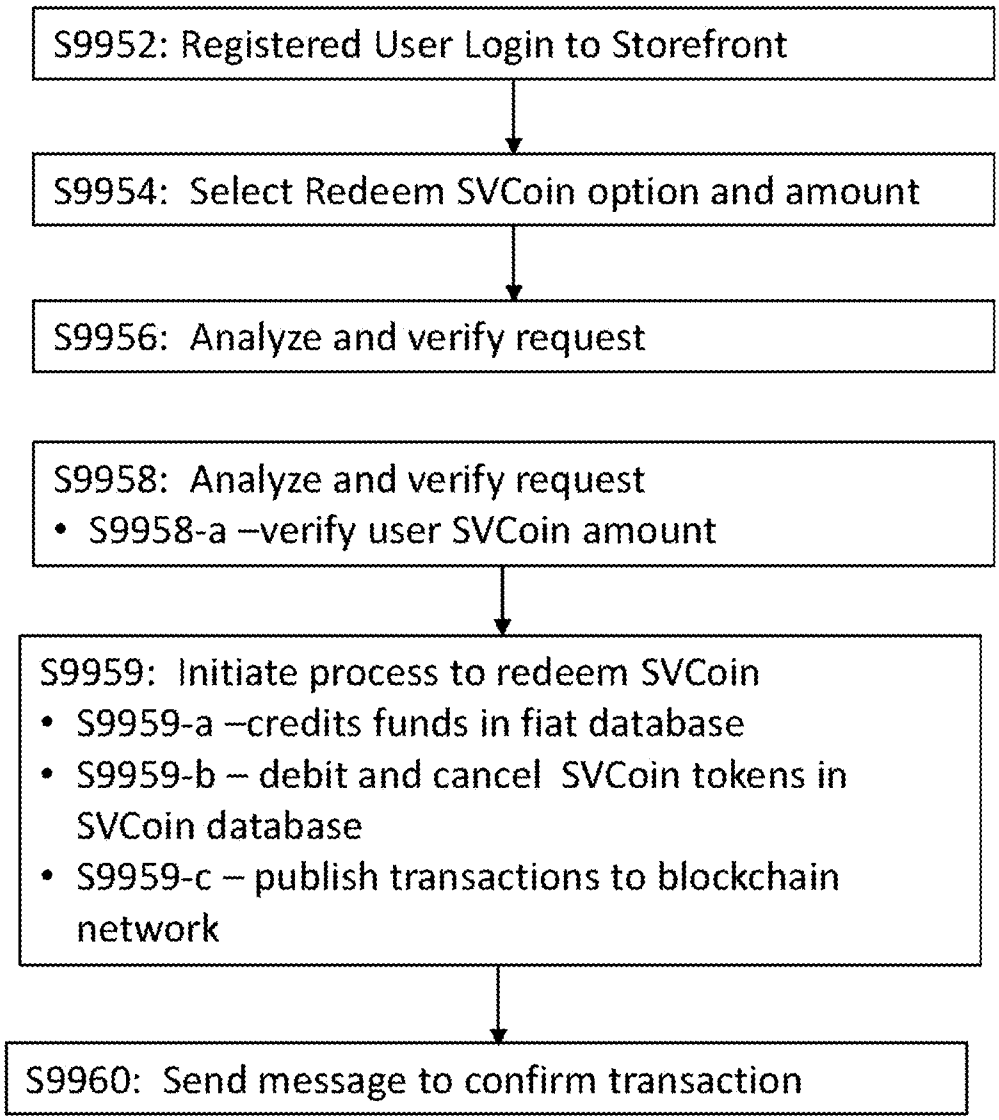
FIG. 9B is an exemplary flow chart of the process for redeeming SVCoin for fiat on a digital asset exchange in accordance with exemplary embodiments of the present invention.
Figure 9C:
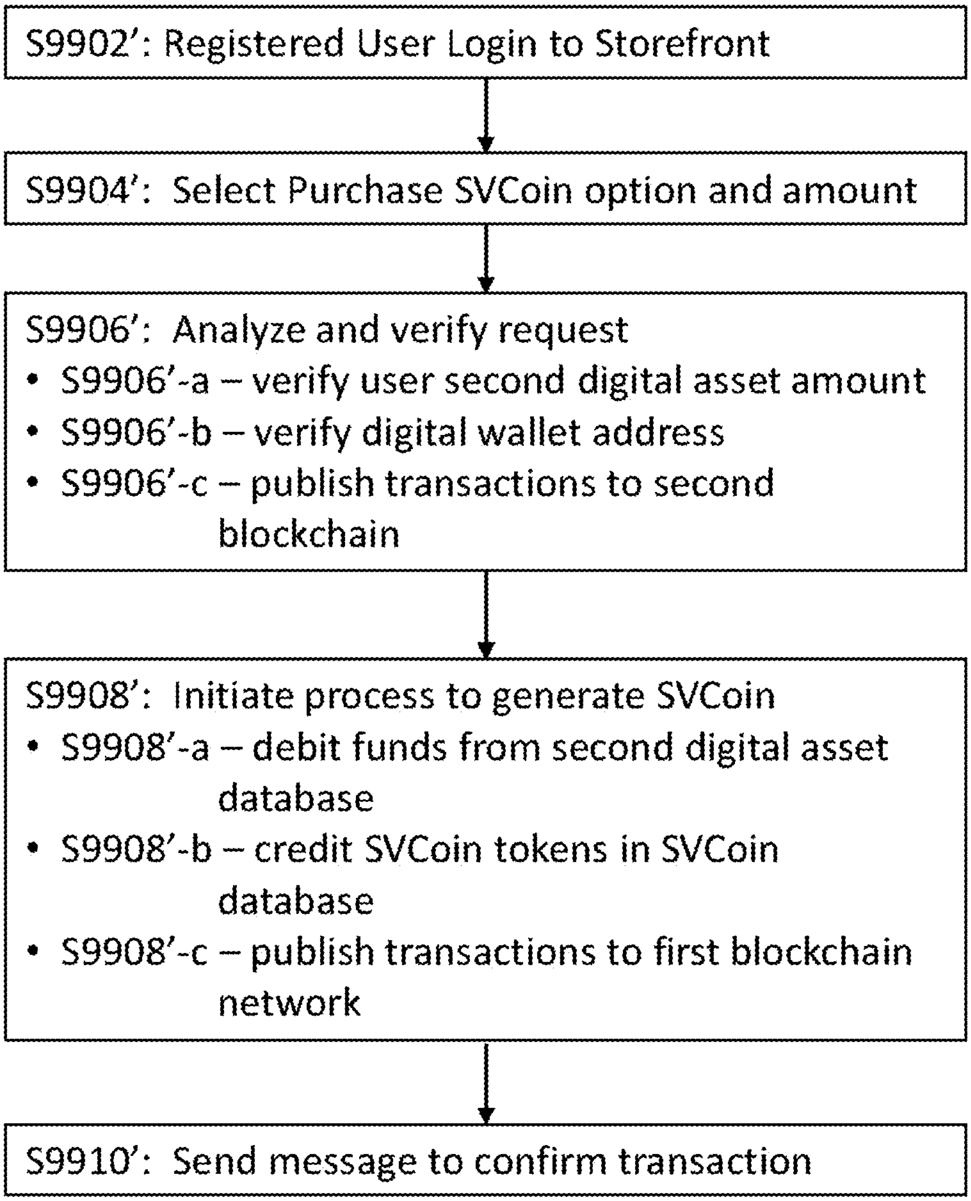
FIG. 9C is an exemplary flow chart of the process for purchasing SVCoin for a second digital asset on a digital asset exchange in accordance with exemplary embodiments of the present invention.
Figure 9D:
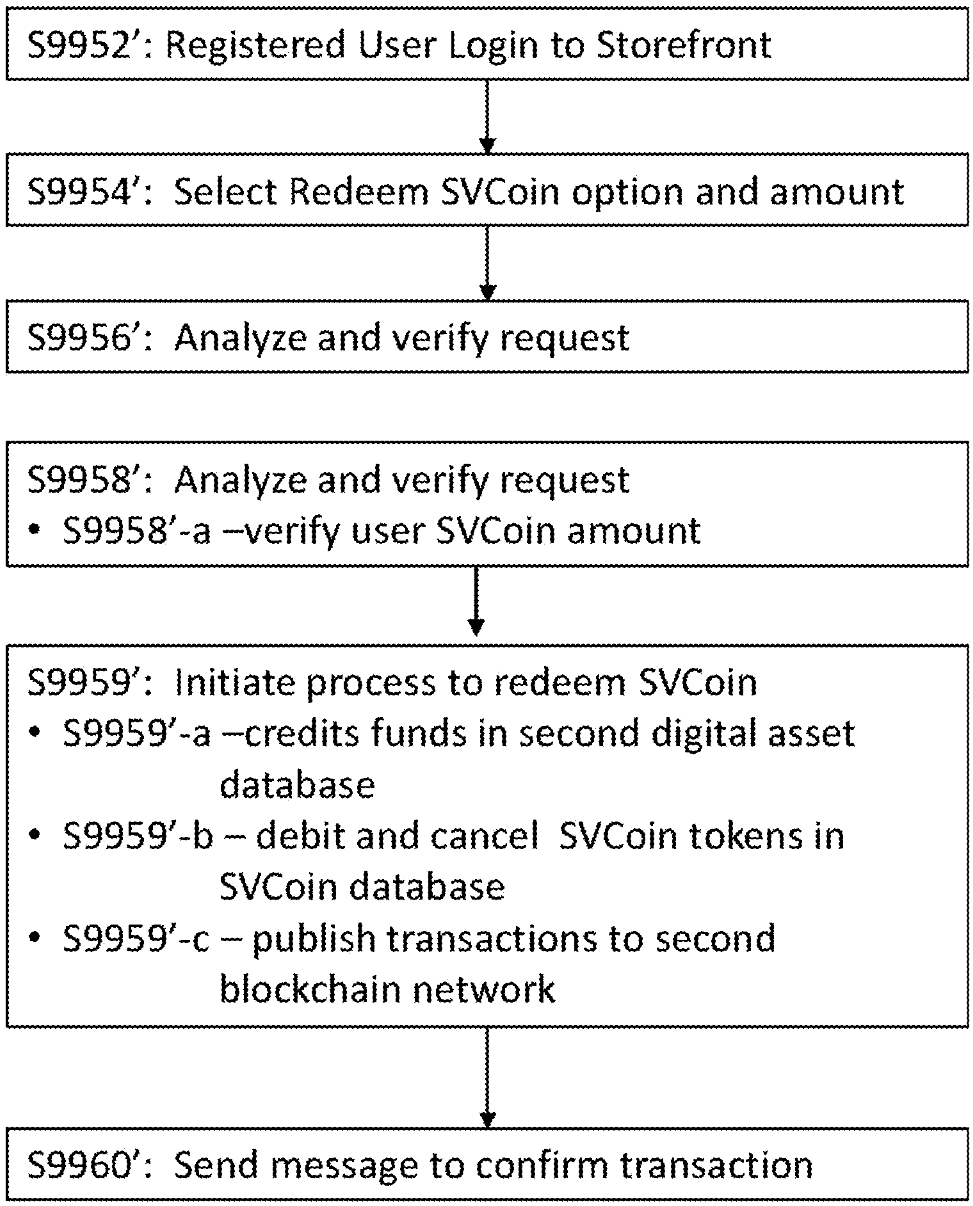
FIG. 9D is an exemplary flow chart of the process for redeeming SVCoin for a second digital asset on a digital asset exchange in accordance with exemplary embodiments of the present invention.
Figure 46:
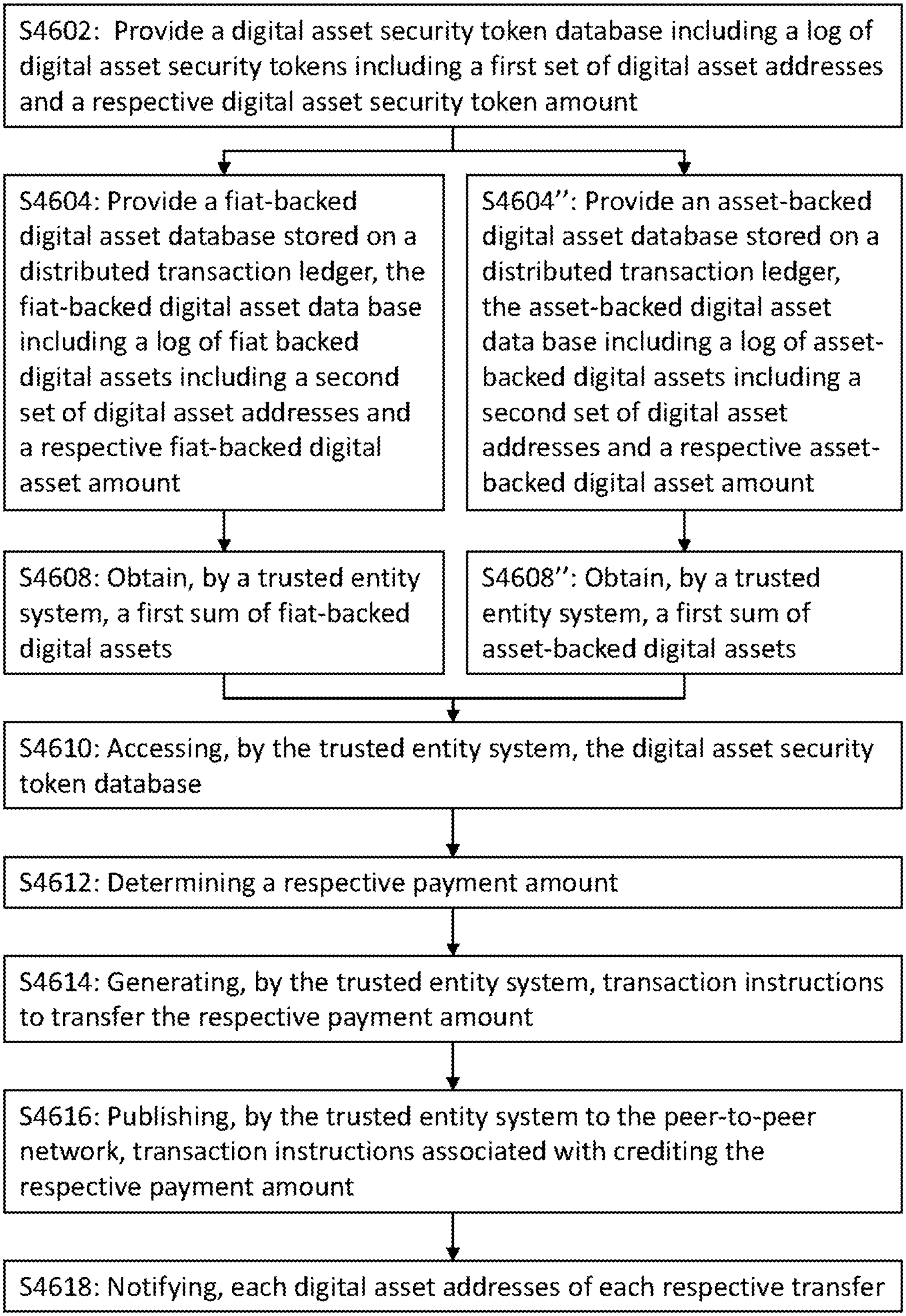
FIG. 46 is a flow chart of a process for issuing electronic payments using a fiat-backed digital asset on a digital asset security token in accordance with exemplary embodiments of the present invention.

FIG. 46 illustrates a process for issuing electronic payments using a fiat-backed digital asset on a digital asset security token in accordance with exemplary embodiments of the present invention. An electronic payment may be, for example, interest in a debt security, royalties associated with intellectual property, dividends associated with an equity security, stock, bond, or the like, and/or a settlement of a lawsuit (e.g., a single party, class action law suit, etc.), to name a few. In embodiments, the process for issuing electronic payments may begin at step S4602. At step S4602, a digital asset security token database is provided. The digital asset security token database may be similar to the security token databases described above in connection with FIGS. 9A-9B and 10, the description of which applying herein. The digital asset security token database may include a log of digital asset security tokens which may include a first set of digital asset addresses, and, for each address of the first set of digital addresses, a security token amount associated with the respective digital address. A simplified example of the first set of digital asset addresses and respective security token amounts is shown in the below table.

First Set of Digital Asset Addresses and Security Token Amount User Digital Asset Address Security Token Amount

| First Set of Digital Asset Addresses and Security Token Amount | | |
|---|---|---|
| User | Digital Asset Address | Security Token Amount |
| User 1 | 1CC3X2gu58d6wXUWMffpuzN9JAfTUWu4Kj | 152 Security Tokens |
| User 2 | 1CC3Xdaegae6wXUWMffpuzN9JAasfdgve208 | 12 Security Tokens |
| User 3 | VIENLN1390dafnjas9gh98y2t3nlvasoihdne | 100 Security Tokens |
| User 4 | 0032JKLIUOINViunlalsiune82_1lkasjfh.10 | 50 Security Tokens |
| User 5 | JKSdfhuawanvawn398097125n13287un3nl | 72 Security Tokens |

As shown in the above table, each digital asset address may have a respective security token amount. Each digital asset address may be associated with one or more users. For example, digital asset address 1CC3X2gu58d6wXUWMffpuzN9JAfTUWu4Kj may be associated with User 1. Each user, in embodiments, may be associated with a public key and a mathematically related private key. A public key in embodiments may be used to generate a digital asset public address. For example, the digital asset address associated with User 3 may be generated by applying a hash algorithm to the public key associated with User 3. The result of the application of the hash on the public key may be the digital asset address.

In embodiments, the security token amount may be any number of security tokens, including zero security tokens. The security tokens, in embodiments, may represent ownership in an asset. For example, a security token may represent a user's ownership interest in: a security registered with a government authority; a security; a stock; a bond; a debt security; an equity security; intellectual property rights; and/or real estate, to name a few. As an example, the security token may represent stocks in Corporation A. Continuing the example, User 4, having a digital asset address of 0032JKLIUOINViunlalsiune82_1lkasjfh.10, may own 50 stocks of Corporation A. Thus, in this example, the each of the stock holders, Users 1-5, may be receiving a dividend payment proportional to the amount of stock each User owns.

In embodiments, each respective address of the first set of digital asset addresses may be tied to a distributed transaction ledger maintained by a plurality of geographically distributed computer systems in a peer-to-peer network. The peer-to-peer network, in embodiments, may be: the ETHEREUM Network, the LIBRA Network, the NEO Network, the BITCOIN network, and/or the STELLAR Network, to name a few. The peer-to-peer network, in embodiments, may be based on a mathematical protocol for proof of work. The peer-to-peer network, in embodiments, may be based on a mathematical protocol for proof of stake. The peer-to-peer network, in embodiments, may be based on a cryptographic mathematical protocol. In embodiments, the peer-to-peer network may be based on a mathematical protocol that is open sourced. In embodiments, the digital asset security token database, in embodiments, may be stored on computer readable media associated with a digital asset security token issuer system (e.g., memory of the digital asset security token issuer system). In embodiments, the digital asset security token database may be maintained and stored on the plurality of geographically distributed computer systems in the peer-to-peer network.

In embodiments, the digital asset security token database may be maintained on a sidechain. A sidechain, in embodiments, may refer to a portion of the distributed transaction ledger. For example, an administrator, user, and/or trusted entity may maintain a portion of the distributed transaction ledger and/or an electronic copy of a portion of the distributed transaction ledger. In embodiments, a portion of the distributed transaction ledger, in the context of a Merkel Tree, may refer to one or more "leafs" of the Merkel Tree, one or more statuses of the Merkel Tree, and/or a complete Merkel Tree with one or more past transactions being "pruned." In the context of a blockchain, the portion of the distributed transaction ledger may be one or more blocks of the blockchain. The information on the sidechain may be updated periodically or aperiodically. For example, the information on the sidechain may be updated, published, and stored on the peer-to-peer network at predetermined times (e.g., twice a day, once a day, once a week, once a month, and/or once a quarter, to name a few). As another example, the information on the sidechain may be updated, published and stored on the peer-to-peer network after the execution of a transaction and/or the execution of a batch of transactions. As yet another example, the information on the sidechain may be updated, published and stored on the peer-to-peer network after the commitment of a transaction and/or the commitment of a batch of transactions. A transaction, for example, may be committed by a consensus of trusted entities of the peer-to-peer network.

In embodiments, the peer-to-peer network may utilize one or more protocols and/or programs for security purposes. For example, the peer-to-peer network may utilize a byzantine fault tolerance protocol as a consensus mechanism. As another example, the peer-to-peer network may utilize a whitelist for the execution of a transaction and/or the transfer of funds. As yet another example, the peer-to-peer network may also utilize one or more of the following: encryption, point-to-point encryption, two-factor authentication, and/or tokenization, to name a few.

The process for issuing electronic payments using a fiat-backed digital asset may continue at step S4604. At step S4604, a fiat-backed digital asset database is provided. The fiat-backed digital asset, in embodiments, may be stored on the distributed transaction ledger and include a log of fiat backed digital assets. The log of fiat backed digital assets may include a second set of digital asset addresses, each associated with one or more users. The digital asset addresses, in embodiments, may also include a respective amount of fiat-backed digital asset amounts. A simplified example of the second set of digital asset addresses and respective fiat-backed digital asset amounts is shown in the below table.

| Second Set of Digital Asset Addresses and Fiat-Backed Digital Asset Amount | | |
|---|---|---|
| User | Digital Asset Address | Fiat-Backed Digital Asset Amount |
| User 6 | UWMffpuzN9JAfTUWu4Kj | 22 Fiat-Backed Digital Assets |
| User 7 | 1CC3Xdaegae6wXUWMffp | 51 Fiat-Backed Digital Assets |

-continued

| Second Set of Digital Asset Addresses and Fiat-Backed Digital Asset Amount | | |
|---|---|---|
| User | Digital Asset Address | Fiat-Backed Digital Asset Amount |
| User 8 | LN1afnjas9gh98y2t3ndne | 3 Fiat-Backed Digital Assets |
| User 9 | basd_1lkasjfh.10bfase24s | 103 Fiat-Backed Digital Assets |
| User 10 | bq38097125n13287un3nl | 28 Fiat-Backed Digital Assets |

As shown in the above table, each digital asset address may have a respective fiat-backed digital asset amount. The fiat-backed digital asset amount may refer to the amount of fiat-backed digital assets that are owned by the digital asset address. In embodiments, each digital asset address may be associated with one or more users. For example, digital asset address LN1afnjas9gh98y2t3ndne may be associated with User 8. Each user, in embodiments, may be associated with a public key and a mathematically related private key. A public key in embodiments may be used to generate a digital asset public address. For example, the digital asset address associated with User 2 may be generated by applying a hash algorithm to the public key associated with User 2. The result of the application of the hash on the public key may be the digital asset address. In embodiments the first set of digital asset addresses may be the same as or associated with the second set of digital asset addresses.

In embodiments, the fiat-backed digital asset amount may be any number of security tokens, including zero fiat-backed digital assets. The fiat-backed digital asset tokens may be backed by one or more assets and/or types of assets that are maintained by one or more entities. The one or more entities may refer to, for example, one or more: trusted entities, administrators, token issuers, verifiers, corporations, and/or banks, to name a few.

In embodiments, the fiat-backed digital asset may be backed by one or more amounts of one or more types of the following assets: one or more types of fiats (e.g., U. S. Dollars, Euro, Yen, British Pound, Swiss Franc, Canadian Dollar, Australian Dollar, New Zealand Dollar, Kuwaiti Dinar, Bahrain Dinar, Oman Rial, Jordan Dinar, Cayman Island Dollar, South African Rand, Mexican Pesos, Renminbi, to name a few); bank accounts in such fiat; one or more government securities denominated in such fiats (e.g., U.S. treasury certificates); municipal bonds or other government issued bonds, shares in exchange trade funds holding currencies or currency future contracts, one or more stocks; one or more bonds; one or more certificate of deposits ("CD"); to name a few. In embodiments, other forms of backed digital assets may also be used, where the assets may also include other digital assets, other physical assets (like real estate and/or inventors), securities, equities, bonds, commodities (e.g., gold, silver, diamonds, crops, oil, to name a few), or financial instruments (e.g., futures, puts, calls, credit default swaps, to name a few) one or more pieces of real estate; gold; diamonds; and/or a combination thereof, to name a few. In embodiments, the assets may be only one kind of asset (e.g., dollars held in a bank or government security or CD, to name a few) or a basket of assets (e.g., multiple fiats, e.g., dollars, euros, yet, to name a few). In embodiments, the value of the fiat-backed digital asset may fluctuate with the value of the assets backing the fiat-backed digital assets. The underlying value of the fiat-backed digital asset, in embodiments, may be updated in real-time, substantially real-time, periodically, and/or aperiodically, to name a few.

In embodiments, the flat-backed digital assets may be issued by a fiat-backed digital asset issuer. The process of issuing fiat-backed digital assets may be similar to the processes discussed in connection with FIGS. 18A-18F, 20A, 20A-1, 20B-20C, 21A-21B, 39A-39E, 43A-43B, and 44, the descriptions of which applying herein. In embodiments, the fiat-backed digital asset issuer may issue fiat-backed digital assets in response to fluctuations in demand of the fiat-backed digital asset. For example, if the demand of the fiat-backed digital asset increases, the fiat-backed digital asset issuer may print fiat-backed digital assets. Continuing the example, the fiat-backed digital asset issuer may print fiat-backed digital assets in proportion to the increase in demand. Alternatively, the fiat-backed digital asset issuer may print fiat-backed digital assets based on a predetermined number, instructions, rules associated with printing fiat-backed digital assets, and/or not in proportion to the increase of demand, to name a few. As another example, if the demand of the fiat-backed digital asset decreases, the fiat-backed digital asset issuer may burn fiat-backed digital assets. Continuing the example, the fiat-backed digital asset issuer may burn fiat-backed digital assets in proportion to the decrease in demand. Alternatively, the fiat-backed digital asset issuer may burn flat-backed digital assets based on a predetermined number, instructions, rules associated with burning fiat-backed digital assets, and/or not in proportion to the decrease of demand, to name a few. In embodiments, the fiat-backed digital asset issuer may require that a commensurate fiat and/or asset(s) deposit be made to account for the printed fiat-backed digital asset.

In embodiments, the process of FIG. 46 may continue, from step S4602, with step S4604". At step S4604", an asset-backed digital asset database is provided. The asset-backed digital asset database, in embodiments, may be stored on the distributed transaction ledger and include a log of asset-backed digital assets. The log of asset-backed digital assets, similar to the log of fiat-backed digital assets, may include a second set of digital asset addresses, each associated with one or more users. The digital asset addresses, in embodiments, may also include a respective amount of asset-backed digital asset amounts.

In embodiments, the asset-backed digital asset may be a digital asset backed by one or more of fiat, digital asset, physical assets, securities, commodities, equities, bonds, financial instruments, basket of digital assets, basket of flat, basket of digital assets and fiat and/or combination thereof, to name a few. For example, an asset-backed digital asset may be a stable value digital asset backed by a second digital asset (maintained on the same and/or different blockchain). In embodiments, a basket of assets (e.g., fiat and/or digital asset) may include one or more types of asset. The types of asset, in embodiments, may be maintained at a fixed ratio (e.g., a predetermined fixed ratio). For example, a basket of digital assets may include a first digital asset, a second digital asset, and a third digital asset. Continuing the example, the basket may be maintained at the fixed ratio of 1:1:2—for every first digital asset, the basket must include one second digital asset and two third digital assets. In embodiments, the value of the asset-backed digital asset may fluctuate with the value of the assets backing the asset-backed digital assets. The underlying value of the asset-backed digital asset, in embodiments, may be updated in real-time, substantially real-time, periodically, and/or aperiodically, to name a few.

In embodiments, the digital asset security issuer system may receive one or more payment requests from one or more digital asset security token holders. For example, a stockholder may request a payment of dividends based on the amount of security tokens the stockholder owns. The payment request, in embodiments, may have rules and/or instructions that control when the one or more security token holders may receive a payment. Continuing the example, Corporation A may only pay dividends after January 2 of each year. Thus, the digital asset security token issuer system may only accept payment requests on or after January 3. As another example, Corporation A may only pay dividends in the month of January. Thus, a payment request, in this example, may only be accepted and processed during the month of January.

In embodiments, a payment request may include the digital asset address of the digital asset security token holder requesting the payment and/or a request to transfer a payment amount of fiat-backed digital assets to the digital asset address of the digital asset security token holder requesting the payment. The payment request may further include a designated address to receive the payment, the amount of security tokens the security token holder owns, and/or a timestamp indicating one or more of the following: the time and/or date at which the payment request was sent, the time and/or date at which the payment request was received, and/or the time and/or date the security token holder wishes to receive the payment.

In embodiments, after receiving the one or more payment requests, the digital asset security token issuer system may verify the one or more payment requests. Verifying the one or more payment requests may include confirming one or more of the following: the validity of the digital asset address of the digital asset security token holder, the digital asset security token amount owned by the security token holder, that the security token holder owns more than zero security token assets, the designated address is not prohibited from receiving a payment on behalf of the security token holder, and/or the security token holder is entitled to receive a payment, to name a few. For example, to confirm the digital asset address, the digital asset security token issuer system may compare the digital asset address included in the payment request to the first set of digital asset addresses. Continuing the example, if the digital asset address included in the payment request is one of the digital asset addresses of the first set of digital asset addresses, the digital asset security token issuer system may verify the digital asset address. If the digital asset address included in the payment request is not verified, the payment request may be denied and/or a notification may be generated and sent by the digital asset security token issuer system to the digital asset address included in the payment request. The notification may indicate that the digital asset address was not confirmed and the payment request has been denied. As another example, if the payment request includes a designated address, the digital asset security token issuer system may verify whether the designated address is on a whitelist associated with the digital asset address that sent the payment request. Continuing the example, if the digital asset address has a whitelist associated with it, the digital asset security token issuer system may compare the designated address to the whitelist. If the designated address is on the whitelist, the designated address may be verified. If the designated address included in the payment request is not verified, the payment request may be denied and/or a notification may be generated and sent by the digital asset security token issuer system to the digital asset address included in the payment request. The notification may indicate that the designated address is not authorized to receive payment and the payment request has been denied. The process of verifying designated addresses in the context of a whitelist may be similar to the process described in connection with FIG. 45, the description of which applying herein.

The process of issuing electronic payments using a fiat-backed digital asset may continue with step S4608 from step S4604. At step S4608, a trusted entity system may obtain a first sum of fiat-backed digital assets. A trusted entity, in embodiments, may be similar to the trusted entities described in this disclosure, the description of which applying herein. In embodiments the trusted entity may be a regulated digital asset exchange (e.g., Gemini). The trusted entity system may be a plurality of trusted entities of the peer-to-peer network. The trusted entity system, in embodiments, may include one or more third-parties and/or government agencies. The first sum, in embodiments, may be obtained by one or more of the following means: purchase, transfer, trade, receive and/or print, to name a few. In embodiments, the fiat-backed digital assets may be issued by a fiat-backed digital asset issuer. For example, the fiat-backed digital assets may be issued through one or more nodes associated with the fiat-backed digital asset issuer. As noted above, the process of issuing fiat-backed digital assets may be similar to the processes discussed in connection with FIGS. 18A-18F, 20A, 20A-1, 20B-20C, 21A-21B, 39A-39E, 43A-43B, and 44, the descriptions of which applying herein.

The process of issuing electronic payments using asset-backed digital assets may continue with step S4608" from step S4604'. At step S4608", a trusted entity system may obtain a first sum of asset-backed digital assets. A trusted entity, in embodiments, may be similar to the trusted entities described in this disclosure, the description of which applying herein. In embodiments the trusted entity may be a regulated digital asset exchange (e.g., Gemini). The trusted entity system may be a plurality of trusted entities of the peer-to-peer network. The trusted entity system, in embodiments, may include one or more third-parties and/or government agencies. The first sum, in embodiments, may be obtained by one or more of the following means: purchase, transfer, trade, receive and/or print, to name a few. For example, the trusted entity system may generate a transaction request including instructions to issue the first sum of asset-backed digital assets. The transaction request, in embodiments the transaction request, may be digitally signed by the trusted entity system (e.g., with a private key associated with the trusted entity system) and/or by the trusted entity system and/or one or more security token holders and/or issuers (e.g., via MPC). In embodiments, the asset-backed digital assets may be issued by an asset-backed digital asset issuer. For example, the asset-backed digital assets may be issued through one or more nodes associated with the asset-backed digital asset issuer. As noted above, the process of issuing asset-backed digital assets may be similar to the processes discussed in connection with FIGS. 18A-18F, 20A, 20A-1, 20B-20C, 21A-21B, 39A-39E, 43A-43B, and 44, the descriptions of which applying herein.

Figure 47:
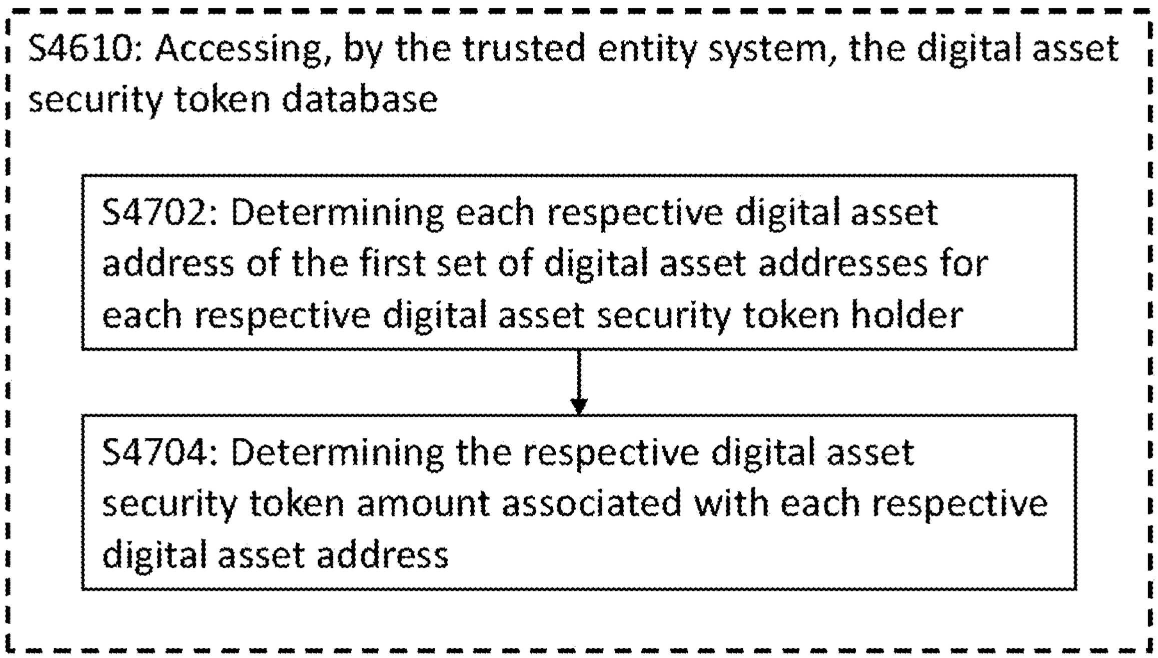
FIG. 47 is a flow chart of a process for issuing electronic payments using a fiat-backed digital asset on a digital asset security token in accordance with exemplary embodiments of the present invention.

The process of FIG. 46 may continue with step S4610. At step S4610, the trusted entity system may access the digital asset security token database. The process of accessing the digital asset security token database continues, in embodiments, at FIG. 47. Referring to FIG. 47, at step S4702, the trusted entity may determine each respective digital asset address of the first set of digital asset addresses for each respective digital asset security token holder. The trusted entity may make this determination by querying the digital asset security token database via the peer-to-peer network. In embodiments, in response, the digital asset security token database may return the digital address of each respective digital asset security token holder. In embodiments, the determined digital asset addresses for each digital asset security token holder may be compared to the first set of digital asset addresses. This confirmation, in embodiments, may verify the first set of digital asset addresses. If one or more of the digital asset addresses is not confirmed, the trusted entity system may: cancel the electronic payment associated with the unconfirmed digital asset address and/or cancel the electronic payment associated with the first set of digital asset addresses. If one or more digital asset addresses included in the first set of digital asset addresses is not confirmed, a notification may be generated and sent by the trusted entity to the one or more digital asset addresses which were not confirmed and/or one or more digital asset addresses of the first set of digital asset addresses. The notification may indicate the digital asset address(es) which were not confirmed and the payment request has been denied. In embodiments, the notification may be sent via a secure channel, such as an encrypted communication. For example, the notification may be encrypted using an asymmetric key, such as a PKI key, and/or using a symmetric key, such as used in TLS, to name a few. The notification, in embodiments, may be encrypted by the sender (e.g., the trusted entity system) and/or the recipient (e.g., security token issuer, security token holder, to name a few), to name a few.

The process of FIG. 47 may continue with step S4704. At step S4704, the trusted entity may determine the respective digital asset security token amount associated with each respective digital asset address. The trusted entity may make this determination by querying the digital asset security token database via the peer-to-peer network. In embodiments, in response, the digital asset security token database may return the security token amount associated with each digital address of each respective digital asset security token holder. In embodiments, the determined security token amount for each digital asset security token holder may be compared to the security token amount included in the log of digital asset security tokens. This confirmation, in embodiments, may verify the respective amounts of security tokens for the first set of digital asset addresses. If one or more of the amounts of security tokens is not confirmed, the trusted entity system may: correct the unconfirmed amount of security tokens, cancel the electronic payment associated with the unconfirmed security token amount and/or cancel the electronic payment associated with the first set of digital asset addresses. If one or more security token amounts included in the log of digital asset security tokens is not confirmed, a notification may be generated and sent by the trusted entity to the one or more digital asset addresses which are associated with the unconfirmed security token amount and/or one or more digital asset addresses of the first set of digital asset addresses. The notification may indicate: the security token amount that was not confirmed, the correct security token amount, the digital asset address(es) associated with the unconfirmed security token amount(s), the payment for the digital asset address(es) associated with the unconfirmed security token amount(s) was altered to reflect the correct security token amount, and/or the payment request has been denied, to name a few.

Referring back to FIG. 46, the process of issuing electronic payments using a flat-backed digital asset may continue with step S4612. At step S4612, a respective payment amount may be determined. Each respective payment amount may be the amount of fiat-backed digital asset that each respective digital asset address is to be paid. Determining a respective payment amount may be similar to the description associated with FIG. 12, the description of which applying herein. The determination of respective payment amounts, in embodiments, may be based on one or more of the following: a fixed notional amount, the first sum of fiat-backed digital assets, and/or the respective digital asset security token amount associated with the respective digital asset address. For example, if the security tokens represent ownership of stock, each stock is represented by one security token, and the payment is for a dividend of 5 dollars per stock, the respective payment amount may be determined by multiplying five dollars by the respective amount of digital asset security tokens. In embodiments, the determination of a respective payment amount may be performed by one or more of the following: the trusted entity system, a trusted entity of the trusted entity system, the digital asset security token issuer, the fiat-backed digital asset token issuer system, and/or one or more security token holders, to name a few. In embodiments, more than one entity may determine the respective payment amounts. The multiple determinations of the respective payment amounts may be used to confirm each respective payment amount. In embodiments, the payment amounts may be related to one or more of the following: a dividend to be paid based on ownership of stock represented by ownership of each digital asset security token; a royalty to be paid based on ownership of intellectual property represented by ownership of each digital asset security token; and/or interested to be paid based on ownership of an asset represented by ownership of each digital asset security token, to name a few.

In embodiments, the trusted entity system may obtain the first sum of fiat-backed digital assets by printing the first sum of fiat-backed digital assets. In embodiments, the first sum may correspond to the sum of the respective payment amounts. In embodiments, the fiat-backed digital asset database may be updated to reflect the newly minted fiat-backed digital assets (and/or just the new transfer of flat-backed digital assets) via transaction instructions sent to the peer-to-peer system which request the flat-backed digital asset database be updated to reflect the addition of new flat-backed digital assets in the amount of the first sum and the corresponding digital asset address associated with each new fiat-backed digital asset.

The process of issuing electronic payments using a fiat-backed digital asset may continue with step S4614. At step S4614, the trusted entity system may generate transaction instructions to transfer each respective payment amount to each respective digital asset address. The transaction request, in embodiments, may include a transfer request of each respective payment amount to be transferred from an account associated with the digital asset security token issuer system to each respective digital asset address. In embodiments, the transaction instructions may further include instructions to update the fiat-backed digital asset database to reserve enough fiat-backed digital assets to cover each respective payment amount (e.g., the first sum of fiat-backed digital assets). For example, the transfer request may include the data listed in the below table.

Transfer Request Information

| From | To | User Digital Asset Address | Payment Amount |
|---|---|---|---|
| Digital Asset | User 1 | 1CC3X2gu58d6wXUWMffpuzN9JAfTUWu4Kj | 22 Fiat-Backed Digital Assets |
| Security Token | User 2 | 1CC3Xdaegae6wXUWMffpuzN9JAasfdgve208 | 51 Fiat-Backed Digital Assets |
| Issuer | User 3 | VIENLN1390dafnjas9gh98y2t3nlvasoihdne | 3 Fiat-Backed Digital Assets |
| System | User 4 | 0032JKLIUOINViunlalsiune82_1lkasjfh.10 | 103 Fiat-Backed Digital Assets |
| Account | User 5 | JKSdfhuawanvawn398097125n13287un3nl | 28 Fiat-Backed Digital Assets |

In embodiments, the transfer request may include a digital signature of the trusted entity system. The digital signature may be a combined digital signature based on of one or more private keys associated with one or more trusted entities of the trusted entity system. The digital signature, in embodiments, may further include one or more private keys associated with the digital asset addresses. In embodiments, the transaction request may be encrypted and/or digitally signed by the trusted entity (e.g., using a private key associated with the trusted entity and/or digitally signed by the trusted entity and/or one or more additional parties (e.g., one or more private keys associated with the digital asset addresses) (e.g., via MPC).

The process of issuing electronic payments using a fiat-backed digital asset may continue with step S4616. At step S4616, the trusted entity system may publish the generated transaction instructions associated with crediting the respective payment amount. In embodiments, the trusted entity system may publish the transaction instructions to the peer-to-peer network via a network (e.g., Network 15). The published transaction request, in embodiments, may be verified by one or more nodes on the blockchain and/or executed by one or more nodes on the blockchain. In embodiments, a transaction fee may be required by one or more nodes, e.g., a miner, to verify and/or execute the generated and/or published transaction request. In embodiments, publishing the transaction instructions may cause the peer-to-peer network to go through a process of executing and/or committing the transaction instructions (e.g., a consensus protocol) which may result in the transfer of each respective amount of fiat-backed digital assets to each respective digital asset address. In embodiments, the execution and/or commitment of the transaction instructions may not affect ownership of the digital asset security tokens. In embodiments, the execution and/or commitment of the transaction instructions may affect ownership of the digital asset security tokens. For example, if the digital asset security tokens represent ownership interest in a settlement of a lawsuit, the payment may be a one-off payment, resulting in the burning of the digital asset security tokens.

The process of issuing electronic payments using a flat-backed digital asset may continue with step S4618. At step S4618, each digital address is notified of each respective transfer. In embodiments, the trusted entity system may generate and send a notification to each respective digital address notifying them of the transfer. In embodiments, the notification(s) may be sent via a secure channel, such as an encrypted communication. For example, the notification(s) may be encrypted using an asymmetric key, such as a PKI key, and/or using a symmetric key, such as used in TLS, to name a few. The notification(s), in embodiments, may be encrypted by the sender (e.g., the trusted entity system) and/or the recipient (e.g., security token issuer, security token holder, to name a few), to name a few. In embodiments, prior to sending the notification, the trusted entity system may confirm that each digital asset address received the correct amount of fiat-backed digital assets. The confirmation process may be a call/return to and from each respective digital asset address. In embodiments, the confirmation process may be a query to the peer-to-peer system for a status of the distributed ledger, which may result in a receipt of the status of the ledger which may include each transfer.

In embodiments, the steps of the processes of FIGS. 46 and 47 may be rearranged or omitted. In embodiments, the fiat-backed digital asset may refer to a first digital asset backed by a second digital asset. In embodiments, the fiat-backed digital asset may be an asset-backed digital asset.

In embodiments, a method of issuing electronic payments using an amount of stable value digital asset tokens may comprise the steps of: (a) providing a digital asset first token database stored on a first set of one or more computer readable media associated with a digital asset first token issuer system associated with a digital asset first token issuer, wherein the digital asset first token database comprising a log of digital asset first tokens including: (i) a first set of digital asset addresses, each respective digital asset address of the first set of digital asset addresses tied to a distributed transaction ledger maintained by a plurality of geographically distributed computer systems in a peer-to-peer network in the form of a blockchain, the first set of digital asset addresses including a first respective digital asset address for each respective digital asset first token holder; and (ii) a respective digital asset first token amount associated with each respective first digital asset address; (b) providing a stable value digital asset token database stored on the distributed transaction ledger maintained by the plurality of geographically distributed computer systems in the peer-to-peer network, the stable value digital asset token database comprising a log of stable value digital asset token including: (i) a second set of digital asset addresses, each respective digital asset address of the second set of digital asset addresses tied to the distributed transaction ledger maintained by the plurality of geographically distributed computer systems in the peer-to-peer network, the second set of digital asset addresses including a second respective digital asset address for each respective stable value digital asset token holder; and (ii) a respective stable value digital asset token amount for each second respective stable value digital asset token address associated with a respective stable value digital asset token holder, wherein the stable value digital asset token stable value digital asset tokens are issued by a stable value administrator; (c) obtaining, by an administrator system associated with an administrator, a first sum of stable value digital asset tokens in a first designated public address associated with the blockchain, wherein the first sum of stable value digital asset tokens are backed by a second amount of a second digital asset based on a fixed ratio of the stable value digital asset token to the second digital asset, wherein the second digital asset is maintained on a second distributed public transaction ledger maintained by a second plurality of geographically distributed computer systems in a second peer-to-peer network in the form of a second blockchain, and wherein the first designated public address corresponds to a first designated public key and a corresponding first designated private key; (d) accessing, by the administrator system, the digital asset first token database to determine: (i) each respective digital asset address of the first set of digital asset addresses for each respective digital asset first token holder; and (ii) the respective digital asset first token amount associated with each respective digital asset address; (e) determining a respective payment amount in stable value digital asset tokens to be made to each respective digital asset address of the first set of digital asset addresses based at least in part on the first sum of stable value digital asset tokens and the respective digital asset first token amount associated with each respective digital asset address of the first set of digital asset addresses: (f) generating, by the administrator system, transaction instructions to transfer the respective payment amount of stable value digital asset tokens from the designated public address to each respective digital asset address of the first set of digital asset addresses with a digital signature based on the first designated private key; (g) publishing, by the administrator system to the blockchain, the transaction instructions, wherein the plurality of geographically distributed computer systems implement the transaction instructions to transfer the respective payment amount of stable value digital asset tokens to each respective digital asset address of the first set of digital asset addresses, where ownership of each digital asset first token remains the same; and (h) confirming, by the administrator system, that each digital asset address of the first set of the digital asset addresses received the determined respective payment amount in stable value digital asset tokens based on reference to the blockchain.

In embodiments, the second digital asset is Bitcoin.

In embodiments, the second digital asset is Bitcoin Cash.

In embodiments, the second digital asset is Stellar.

In embodiments, the second digital asset is Filecoin.

In embodiments, the second digital asset is Litecoin.

In embodiments, the second digital asset is Tezos.

In embodiments, the second digital asset is Zcash.

In embodiments, the second digital asset is Polkadot.

In embodiments, the second digital asset is Atom.

In embodiments, the blockchain is an Ethereum blockchain.

In embodiments, the blockchain is a Neo blockchain.

In embodiments, the method may further comprise: (i) notifying, by the administrator system, each digital asset address of the first set of the digital asset addresses of each respective transfer of stable value digital asset tokens to each respective digital asset address of the first set of digital asset addresses.

In embodiments, the digital asset first token is a security registered with a government authority.

In embodiments, the digital asset first token is a debt security and the electronic payments are interest.

In embodiments, the digital asset first token is an equity security and the electronic payments are dividends.

In embodiments, the digital asset first token is secured by intellectual property rights and the electronic payments are royalties.

In embodiments, the peer-to-peer network is based on a mathematical protocol for proof of work.

In embodiments, the peer-to-peer network is based on a mathematical protocol for proof of stake.

In embodiments, the peer-to-peer network is based on a cryptographic mathematical protocol.

In embodiments, the method may further comprise an additional step of publishing, by the administrator system to a side ledger, the transaction instructions associated with crediting the respective payment amount of stable value digital asset tokens to each respective digital asset address of the first set of digital asset addresses, and wherein the publishing step (g) includes publishing the transaction instructions from the side ledger to the distributed asset ledger periodically or aperiodically.

In embodiments, the method may further comprise steps of: (i) receiving, at the digital asset first token issuer system, from at least one digital asset first token holder, a payment request prior to the obtaining step (c), the payment request including: (1) the digital asset address of the digital asset first token holder; and (2) a request to transfer a payment amount of stable value digital asset tokens to the digital asset address of the digital asset first token holder; and (j) confirming, at the digital asset first token issuer system, that: (1) the digital asset address of the digital asset first token holder is valid; (2) the digital asset first token amount of digital asset first tokens associated with the address of the digital asset first token holder is more than zero; and (3) the digital asset first token holder is entitled to payment; and (k) generating, at the digital asset first token issuer system, the first request based at least in part on the payment request when the digital asset address of the at least one digital asset first token holder is valid, the digital asset first token amount of digital asset first tokens associated with the digital asset address of the at least one digital asset first token holder is more than zero and the at least one digital asset first token holder is entitled to payment.

In embodiments, the first set of one or more computer readable media associated with the digital asset first token issuer system is operably connected to a node of the plurality of geographically distributed computer systems in the peer-to-peer network in the form of the blockchain, wherein the node is maintained by the digital asset first token issuer.

In embodiments, the digital asset first token database is maintained and stored on the plurality of geographically distributed computer systems in the peer-to-peer network.

In embodiments, the digital asset first token database is maintained on a sidechain, separate from the peer-to-peer network, wherein information on the sidechain is published and stored on the peer-to-peer network periodically or aperiodically.

In embodiments, the generating step (f) includes generating, by the administrator system, transaction instructions for the first sum of stable value digital asset tokens by updating the stable value digital asset token database to reserve stable value digital asset tokens in the amount of the first sum.

In embodiments, the payment amount relates to a dividend to be paid based on ownership of each digital asset first token.

In embodiments, the payment amount relates to a royalty to be paid based on ownership of each digital asset first token.

In embodiments, the payment amount relates to interest to be paid based on ownership of each digital asset first token.

In embodiments, the peer-to-peer network uses a byzantine fault tolerance protocol as a consensus mechanism.

In embodiments, a method of issuing electronic payments using an amount of stable value digital asset tokens may comprise the steps of: (a) providing a digital asset first token database stored on a first set of one or more computer readable media associated with a digital asset first token issuer system associated with a digital asset first token issuer, wherein the digital asset first token database comprising a log of digital asset first tokens including: (i) a first set of digital asset addresses, each respective digital asset address of the first set of digital asset addresses tied to a distributed transaction ledger maintained by a plurality of geographically distributed computer systems in a peer-to-peer network in the form of a blockchain, the first set of digital asset addresses including a first respective digital asset address for each respective digital asset first token holder; and (ii) a respective digital asset first token amount associated with each respective first digital asset address; (b) providing a stable value digital asset token database stored on the distributed transaction ledger maintained by the plurality of geographically distributed computer systems in the peer-to-peer network, the stable value digital asset token database comprising a log of stable value digital asset token including: (i) a second set of digital asset addresses, each respective digital asset address of the second set of digital asset addresses tied to the distributed transaction ledger maintained by the plurality of geographically distributed computer systems in the peer-to-peer network, the second set of digital asset addresses including a second respective digital asset address for each respective stable value digital asset token holder; and (ii) a respective stable value digital asset token amount for each second respective stable value digital asset token address associated with a respective stable value digital asset token holder, wherein the stable value digital asset token stable value digital asset tokens are issued by a stable value digital asset exchange; (c) obtaining, by a digital asset exchange system associated with a digital asset exchange, a first sum of stable value digital asset tokens in a first designated public address associated with the blockchain, wherein the first sum of stable value digital asset tokens are backed by a second amount of a second digital asset based on a fixed ratio of the stable value digital asset token to the second digital asset, wherein the second digital asset is maintained on a second distributed public transaction ledger maintained by a second plurality of geographically distributed computer systems in a second peer-to-peer network in the form of a second blockchain, and wherein the first designated public address corresponds to a first designated public key and a corresponding first designated private key; (d) accessing, by the digital asset exchange system, the digital asset first token database to determine: (i) each respective digital asset address of the first set of digital asset addresses for each respective digital asset first token holder; and (ii) the respective digital asset first token amount associated with each respective digital asset address; (e) determining a respective payment amount in stable value digital asset tokens to be made to each respective digital asset address of the first set of digital asset addresses based at least in part on the first sum of stable value digital asset tokens and the respective digital asset first token amount associated with each respective digital asset address of the first set of digital asset addresses; (f) generating, by the digital asset exchange system, transaction instructions to transfer the respective payment amount of stable value digital asset tokens from the designated public address to each respective digital asset address of the first set of digital asset addresses with a digital signature based on the first designated private key; (g) publishing, by the digital asset exchange system to the blockchain, the transaction instructions, wherein the plurality of geographically distributed computer systems implement the transaction instructions to transfer the respective payment amount of stable value digital asset tokens to each respective digital asset address of the first set of digital asset addresses, where ownership of each digital asset first token remains the same; and (h) confirming, by the digital asset exchange system, that each digital asset address of the first set of the digital asset addresses received the determined respective payment amount in stable value digital asset tokens based on reference to the blockchain.

In embodiments, the second digital asset is Bitcoin.

In embodiments, the second digital asset is Bitcoin Cash.

In embodiments, the second digital asset is Stellar.

In embodiments, the second digital asset is Filecoin.

In embodiments, the second digital asset is Litecoin.

In embodiments, the second digital asset is Tezos.

In embodiments, the second digital asset is Zcash.

In embodiments, the second digital asset is Polkadot.

In embodiments, the second digital asset is Atom.

In embodiments, the blockchain is an Ethereum blockchain.

In embodiments, the blockchain is a Neo blockchain.

In embodiments, the method may further comprise: (i) notifying, by the digital asset exchange system, each digital asset address of the first set of the digital asset addresses of each respective transfer of stable value digital asset tokens to each respective digital asset address of the first set of digital asset addresses.

In embodiments, the digital asset first token is a security registered with a government authority.

In embodiments, the digital asset first token is a debt security and the electronic payments are interest.

In embodiments, the digital asset first token is an equity security and the electronic payments are dividends.

In embodiments, the digital asset first token is secured by intellectual property rights and the electronic payments are royalties.

In embodiments, the peer-to-peer network is based on a mathematical protocol for proof of work.

In embodiments, the peer-to-peer network is based on a mathematical protocol for proof of stake.

In embodiments, the peer-to-peer network is based on a cryptographic mathematical protocol.

In embodiments, the method may further comprise an additional step of publishing, by the digital asset exchange system to a side ledger, the transaction instructions associated with crediting the respective payment amount of stable value digital asset tokens to each respective digital asset address of the first set of digital asset addresses, and wherein the publishing step (g) includes publishing the transaction instructions from the side ledger to the distributed asset ledger periodically or aperiodically.

In embodiments, the method may further comprise steps of: (i) receiving, at the digital asset first token issuer system, from at least one digital asset first token holder, a payment request prior to the obtaining step (c), the payment request including: (3) the digital asset address of the digital asset first token holder; and (4) a request to transfer a payment amount of stable value digital asset tokens to the digital asset address of the digital asset first token holder; and (j) confirming, at the digital asset first token issuer system, that: (1) the digital asset address of the digital asset first token holder is valid; (2) the digital asset first token amount of digital asset first tokens associated with the address of the digital asset first token holder is more than zero; and (3) the digital asset first token holder is entitled to payment; and (k) generating, at the digital asset first token issuer system, the first request based at least in part on the payment request when the digital asset address of the at least one digital asset first token holder is valid, the digital asset first token amount of digital asset first tokens associated with the digital asset address of the at least one digital asset first token holder is more than zero and the at least one digital asset first token holder is entitled to payment.

In embodiments, the first set of one or more computer readable media associated with the digital asset first token issuer system is operably connected to a node of the plurality of geographically distributed computer systems in the peer-to-peer network in the form of the blockchain, wherein the node is maintained by the digital asset first token issuer.

In embodiments, the digital asset first token database is maintained and stored on the plurality of geographically distributed computer systems in the peer-to-peer network.

In embodiments, the digital asset first token database is maintained on a sidechain, separate from the peer-to-peer network, wherein information on the sidechain is published and stored on the peer-to-peer network periodically or aperiodically.

In embodiments, the generating step (f) includes generating, by the digital asset exchange system, transaction instructions for the first sum of stable value digital asset tokens by updating the stable value digital asset token database to reserve stable value digital asset tokens in the amount of the first sum.

In embodiments, the payment amount relates to a dividend to be paid based on ownership of each digital asset first token.

In embodiments, the payment amount relates to a royalty to be paid based on ownership of each digital asset first token.

In embodiments, the payment amount relates to interest to be paid based on ownership of each digital asset first token.

In embodiments, the peer-to-peer network uses a byzantine fault tolerance protocol as a consensus mechanism.

In embodiments, a method of issuing electronic payments using an amount of stable value digital asset tokens may comprise the steps of: (a) providing a digital asset first token database stored on a first set of one or more computer readable media associated with a digital asset first token issuer system associated with a digital asset first token issuer, wherein the digital asset first token database comprising a log of digital asset first tokens including: (i) a first set of digital asset addresses, each respective digital asset address of the first set of digital asset addresses tied to a distributed transaction ledger maintained by a plurality of geographically distributed computer systems in a peer-to-peer network in the form of a blockchain, the first set of digital asset addresses including a first respective digital asset address for each respective digital asset first token holder; and (ii) a respective digital asset first token amount associated with each respective first digital asset address; (b) providing a stable value digital asset token database stored on the distributed transaction ledger maintained by the plurality of geographically distributed computer systems in the peer-to-peer network, the stable value digital asset token database comprising a log of stable value digital asset token including: (i) a second set of digital asset addresses, each respective digital asset address of the second set of digital asset addresses tied to the distributed transaction ledger maintained by the plurality of geographically distributed computer systems in the peer-to-peer network, the second set of digital asset addresses including a second respective digital asset address for each respective stable value digital asset token holder; and (ii) a respective stable value digital asset token amount for each second respective stable value digital asset token address associated with a respective stable value digital asset token holder, wherein the stable value digital asset token stable value digital asset tokens are issued by a stable value digital asset token issuer; (c) obtaining, by a digital asset token issuer system associated with a digital asset token issuer, a first sum of stable value digital asset tokens in a first designated public address associated with the blockchain, wherein the first sum of stable value digital asset tokens are backed by a second amount of a second digital asset based on a fixed ratio of the stable value digital asset token to the second digital asset, wherein the second digital asset is maintained on a second distributed public transaction ledger maintained by a second plurality of geographically distributed computer systems in a second peer-to-peer network in the form of a second blockchain, and wherein the first designated public address corresponds to a first designated public key and a corresponding first designated private key; (d) accessing, by the digital asset token issuer system, the digital asset first token database to determine: (i) each respective digital asset address of the first set of digital asset addresses for each respective digital asset first token holder; and (ii) the respective digital asset first token amount associated with each respective digital asset address; (e) determining a respective payment amount in stable value digital asset tokens to be made to each respective digital asset address of the first set of digital asset addresses based at least in part on the first sum of stable value digital asset tokens and the respective digital asset first token amount associated with each respective digital asset address of the first set of digital asset addresses; (f) generating, by the digital asset token issuer system, transaction instructions to transfer the respective payment amount of stable value digital asset tokens from the designated public address to each respective digital asset address of the first set of digital asset addresses with a digital signature based on the first designated private key; (g) publishing, by the digital asset token issuer system to the blockchain, the transaction instructions, wherein the plurality of geographically distributed computer systems implement the transaction instructions to transfer the respective payment amount of stable value digital asset tokens to each respective digital asset address of the first set of digital asset addresses, where ownership of each digital asset first token remains the same; and (h) confirming, by the digital asset token issuer system, that each digital asset address of the first set of the digital asset addresses received the determined respective payment amount in stable value digital asset tokens based on reference to the blockchain.

In embodiments, the second digital asset is Bitcoin.

In embodiments, the second digital asset is Bitcoin Cash.

In embodiments, the second digital asset is Stellar.

In embodiments, the second digital asset is Filecoin.

In embodiments, the second digital asset is Litecoin.

In embodiments, the second digital asset is Tezos.

In embodiments, the second digital asset is Zcash.

In embodiments, the second digital asset is Polkadot.

In embodiments, the second digital asset is Atom.

In embodiments, the blockchain is an Ethereum blockchain.

In embodiments, the blockchain is a Neo blockchain.

In embodiments, the method may further comprise: (i) notifying, by the digital asset token issuer system, each digital asset address of the first set of the digital asset addresses of each respective transfer of stable value digital asset tokens to each respective digital asset address of the first set of digital asset addresses.

In embodiments, the digital asset first token is a security registered with a government authority.

In embodiments, the digital asset first token is a debt security and the electronic payments are interest.

In embodiments, the digital asset first token is an equity security and the electronic payments are dividends.

In embodiments, the digital asset first token is secured by intellectual property rights and the electronic payments are royalties.

In embodiments, the peer-to-peer network is based on a mathematical protocol for proof of work.

In embodiments, the peer-to-peer network is based on a mathematical protocol for proof of stake.

In embodiments, the peer-to-peer network is based on a cryptographic mathematical protocol.

In embodiments, the method may further comprise an additional step of publishing, by the digital asset token issuer system to a side ledger, the transaction instructions associated with crediting the respective payment amount of stable value digital asset tokens to each respective digital asset address of the first set of digital asset addresses, and wherein the publishing step (g) includes publishing the transaction instructions from the side ledger to the distributed asset ledger periodically or aperiodically.

In embodiments, the method may further comprise steps of: (i) receiving, at the digital asset first token issuer system, from at least one digital asset first token holder, a payment request prior to the obtaining step (c), the payment request including: (5) the digital asset address of the digital asset first token holder; and (6) a request to transfer a payment amount of stable value digital asset tokens to the digital asset address of the digital asset first token holder; and (j) confirming, at the digital asset first token issuer system, that: (1) the digital asset address of the digital asset first token holder is valid; (2) the digital asset first token amount of digital asset first tokens associated with the address of the digital asset first token holder is more than zero; and (3) the digital asset first token holder is entitled to payment; and (k) generating, at the digital asset first token issuer system, the first request based at least in part on the payment request when the digital asset address of the at least one digital asset first token holder is valid, the digital asset first token amount of digital asset first tokens associated with the digital asset address of the at least one digital asset first token holder is more than zero and the at least one digital asset first token holder is entitled to payment.

In embodiments, the first set of one or more computer readable media associated with the digital asset first token issuer system is operably connected to a node of the plurality of geographically distributed computer systems in the peer-to-peer network in the form of the blockchain, wherein the node is maintained by the digital asset first token issuer.

In embodiments, the digital asset first token database is maintained and stored on the plurality of geographically distributed computer systems in the peer-to-peer network.

In embodiments, the digital asset first token database is maintained on a sidechain, separate from the peer-to-peer network, wherein information on the sidechain is published and stored on the peer-to-peer network periodically or aperiodically.

In embodiments, the generating step (f) includes generating, by the digital asset token issuer system, transaction instructions for the first sum of stable value digital asset tokens by updating the stable value digital asset token database to reserve stable value digital asset tokens in the amount of the first sum.

In embodiments, the payment amount relates to a dividend to be paid based on ownership of each digital asset first token.

In embodiments, the payment amount relates to a royalty to be paid based on ownership of each digital asset first token.

In embodiments, the payment amount relates to interest to be paid based on ownership of each digital asset first token.

In embodiments, the peer-to-peer network uses a byzantine fault tolerance protocol as a consensus mechanism.

In embodiments, a method of issuing electronic payments using an amount of stable value digital asset tokens may comprise the steps of: (a) providing a digital asset first token database stored on a first set of one or more computer readable media associated with a digital asset first token issuer system associated with a digital asset first token issuer, wherein the digital asset first token database comprising a log of digital asset first tokens including: (i) a first set of digital asset addresses, each respective digital asset address of the first set of digital asset addresses tied to a distributed transaction ledger maintained by a plurality of geographically distributed computer systems in a peer-to-peer network in the form of a blockchain, the first set of digital asset addresses including a first respective digital asset address for each respective digital asset first token holder; and (ii) a respective digital asset first token amount associated with each respective first digital asset address; (b) providing a stable value digital asset token database stored on the distributed transaction ledger maintained by the plurality of geographically distributed computer systems in the peer-to-peer network, the stable value digital asset token database comprising a log of stable value digital asset token including: (i) a second set of digital asset addresses, each respective digital asset address of the second set of digital asset addresses tied to the distributed transaction ledger maintained by the plurality of geographically distributed computer systems in the peer-to-peer network, the second set of digital asset addresses including a second respective digital asset address for each respective stable value digital asset token holder; and (ii) a respective stable value digital asset token amount for each second respective stable value digital asset token address associated with a respective stable value digital asset token holder, wherein the stable value digital asset token stable value digital asset tokens are issued by a stable value administrator; (c) obtaining, by an administrator system associated with an administrator, a first sum of stable value digital asset tokens in a first designated public address associated with the blockchain, wherein the first sum of stable value digital asset tokens are backed by a second amount of currency maintained by a custodian based on a fixed ratio of the stable value digital asset token to the currency, and wherein the first designated public address corresponds to a first designated public key and a corresponding first designated private key; (d) accessing, by the administrator system, the digital asset first token database to determine: (i) each respective digital asset address of the first set of digital asset addresses for each respective digital asset first token holder; and (ii) the respective digital asset first token amount associated with each respective digital asset address; (e) determining a respective payment amount in stable value digital asset tokens to be made to each respective digital asset address of the first set of digital asset addresses based at least in part on the first sum of stable value digital asset tokens and the respective digital asset first token amount associated with each respective digital asset address of the first set of digital asset addresses; (f) generating, by the administrator system, transaction instructions to transfer the respective payment amount of stable value digital asset tokens from the designated public address to each respective digital asset address of the first set of digital asset addresses with a digital signature based on the first designated private key; (g) publishing, by the administrator system to the blockchain, the transaction instructions, wherein the plurality of geographically distributed computer systems implement the transaction instructions to transfer the respective payment amount of stable value digital asset tokens to each respective digital asset address of the first set of digital asset addresses, where ownership of each digital asset first token remains the same; and (h) confirming, by the administrator system, that each digital asset address of the first set of the digital asset addresses received the determined respective payment amount in stable value digital asset tokens based on reference to the blockchain.

In embodiments, the currency is a fiat currency.

In embodiments, the fiat currency is U.S. dollar.

In embodiments, the fixed ratio is one stable value digital asset token for 1 U.S. dollar.

In embodiments, the fixed ratio is 100 stable value digital asset tokens for one U.S. dollar.

In embodiments, the fiat currency is GB pound.

In embodiments, the fiat currency is SG dollar.

In embodiments, the fiat currency is EUR.

In embodiments, the fiat currency is HK dollar.

In embodiments, the fiat currency is Canadian dollar.

In embodiments, the fiat currency is Australian dollar.

In embodiments, the fiat currency is Yen.

In embodiments, the currency is a cryptocurrency.

In embodiments, the cryptocurrency is Bitcoin.

In embodiments, the cryptocurrency is Litecoin.

In embodiments, the cryptocurrency is Bitcoin Cash.

In embodiments, the cryptocurrency is Filecoin.

In embodiments, the cryptocurrency is Stellar.

In embodiments, the cryptocurrency is Polkadot.

In embodiments, the cryptocurrency is Atom.

In embodiments, the cryptocurrency is Tezos.

In embodiments, the blockchain is an Ethereum blockchain.

In embodiments, the blockchain is a Neo blockchain.

In embodiments, the method may further comprise: (i) notifying, by the administrator system, each digital asset address of the first set of the digital asset addresses of each respective transfer of stable value digital asset tokens to each respective digital asset address of the first set of digital asset addresses.

In embodiments, the digital asset first token is a security registered with a government authority.

In embodiments, the digital asset first token is a debt security and the electronic payments are interest.

In embodiments, the digital asset first token is an equity security and the electronic payments are dividends.

In embodiments, the digital asset first token is secured by intellectual property rights and the electronic payments are royalties.

In embodiments, the peer-to-peer network is based on a mathematical protocol for proof of work.

In embodiments, the peer-to-peer network is based on a mathematical protocol for proof of stake.

In embodiments, the peer-to-peer network is based on a cryptographic mathematical protocol.

In embodiments, the method may further comprise an additional step of publishing, by the administrator system to a side ledger, the transaction instructions associated with crediting the respective payment amount of stable value digital asset tokens to each respective digital asset address of the first set of digital asset addresses, and wherein the publishing step (g) includes publishing the transaction instructions from the side ledger to the distributed asset ledger periodically or aperiodically.

In embodiments, the method may further comprise steps of: (i) receiving, at the digital asset first token issuer system, from at least one digital asset first token holder, a payment request prior to the obtaining step (c), the payment request including: (7) the digital asset address of the digital asset first token holder; and (8) a request to transfer a payment amount of stable value digital asset tokens to the digital asset address of the digital asset first token holder; and (j) confirming, at the digital asset first token issuer system, that: (1) the digital asset address of the digital asset first token holder is valid; (2) the digital asset first token amount of digital asset first tokens associated with the address of the digital asset first token holder is more than zero; and (3) the digital asset first token holder is entitled to payment; and (k) generating, at the digital asset first token issuer system, the first request based at least in part on the payment request when the digital asset address of the at least one digital asset first token holder is valid, the digital asset first token amount of digital asset first tokens associated with the digital asset address of the at least one digital asset first token holder is more than zero and the at least one digital asset first token holder is entitled to payment.

In embodiments, the first set of one or more computer readable media associated with the digital asset first token issuer system is operably connected to a node of the plurality of geographically distributed computer systems in the peer-to-peer network in the form of the blockchain, wherein the node is maintained by the digital asset first token issuer.

In embodiments, the digital asset first token database is maintained and stored on the plurality of geographically distributed computer systems in the peer-to-peer network.

In embodiments, the digital asset first token database is maintained on a sidechain, separate from the peer-to-peer network, wherein information on the sidechain is published and stored on the peer-to-peer network periodically or aperiodically.

In embodiments, the generating step (f) includes generating, by the administrator system, transaction instructions for the first sum of stable value digital asset tokens by updating the stable value digital asset token database to reserve stable value digital asset tokens in the amount of the first sum.

In embodiments, the payment amount relates to a dividend to be paid based on ownership of each digital asset first token.

In embodiments, the payment amount relates to a royalty to be paid based on ownership of each digital asset first token.

In embodiments, the payment amount relates to interest to be paid based on ownership of each digital asset first token.

In embodiments, the peer-to-peer network uses a byzantine fault tolerance protocol as a consensus mechanism.

In embodiments, a method of issuing electronic payments using an amount of stable value digital asset tokens may comprise the steps of: (a) providing a digital asset first token database stored on a first set of one or more computer readable media associated with a digital asset first token issuer system associated with a digital asset first token issuer, wherein the digital asset first token database comprising a log of digital asset first tokens including: (i) a first set of digital asset addresses, each respective digital asset address of the first set of digital asset addresses tied to a distributed transaction ledger maintained by a plurality of geographically distributed computer systems in a peer-to-peer network in the form of a blockchain, the first set of digital asset addresses including a first respective digital asset address for each respective digital asset first token holder; and (ii) a respective digital asset first token amount associated with each respective first digital asset address; (b) providing a stable value digital asset token database stored on the distributed transaction ledger maintained by the plurality of geographically distributed computer systems in the peer-to-peer network, the stable value digital asset token database comprising a log of stable value digital asset token including: (i) a second set of digital asset addresses, each respective digital asset address of the second set of digital asset addresses tied to the distributed transaction ledger maintained by the plurality of geographically distributed computer systems in the peer-to-peer network, the second set of digital asset addresses including a second respective digital asset address for each respective stable value digital asset token holder; and (ii) a respective stable value digital asset token amount for each second respective stable value digital asset token address associated with a respective stable value digital asset token holder, wherein the stable value digital asset token stable value digital asset tokens are issued by a stable value digital asset token issuer; (c) obtaining, by a digital asset exchange system associated with a digital asset exchange, a first sum of stable value digital asset tokens in a first designated public address associated with the blockchain, wherein the first sum of stable value digital asset tokens are backed by a second amount of currency maintained by a custodian based on a fixed ratio of the stable value digital asset token to the currency, and wherein the first designated public address corresponds to a first designated public key and a corresponding first designated private key; (d) accessing, by the digital asset exchange system, the digital asset first token database to determine: (i) each respective digital asset address of the first set of digital asset addresses for each respective digital asset first token holder; and (ii) the respective digital asset first token amount associated with each respective digital asset address; (e) determining a respective payment amount in stable value digital asset tokens to be made to each respective digital asset address of the first set of digital asset addresses based at least in part on the first sum of stable value digital asset tokens and the respective digital asset first token amount associated with each respective digital asset address of the first set of digital asset addresses: (f) generating, by the digital asset exchange system, transaction instructions to transfer the respective payment amount of stable value digital asset tokens from the designated public address to each respective digital asset address of the first set of digital asset addresses with a digital signature based on the first designated private key; (g) publishing, by the digital asset exchange system to the blockchain, the transaction instructions, wherein the plurality of geographically distributed computer systems implement the transaction instructions to transfer the respective payment amount of stable value digital asset tokens to each respective digital asset address of the first set of digital asset addresses, where ownership of each digital asset first token remains the same; and (h) confirming, by the digital asset exchange system, that each digital asset address of the first set of the digital asset addresses received the determined respective payment amount in stable value digital asset tokens based on reference to the blockchain.

In embodiments, the currency is a fiat currency.

In embodiments, the fiat currency is U.S. dollar.

In embodiments, the fixed ratio is one stable value digital asset token for 1 U.S. dollar.

In embodiments, the fixed ratio is 100 stable value digital asset tokens for one U.S. dollar.

In embodiments, the fiat currency is GB pound.

In embodiments, the flat currency is SG dollar.

In embodiments, the fiat currency is EUR.

In embodiments, the fiat currency is HK dollar.

In embodiments, the fiat currency is Canadian dollar.

In embodiments, the fiat currency is Australian dollar.

In embodiments, the flat currency is Yen.

In embodiments, the currency is a cryptocurrency.

In embodiments, the cryptocurrency is Bitcoin.

In embodiments, the cryptocurrency is Litecoin.

In embodiments, the cryptocurrency is Bitcoin Cash.

In embodiments, the cryptocurrency is Filecoin.

In embodiments, the cryptocurrency is Zcash.

In embodiments, the cryptocurrency is Stellar.

In embodiments, the cryptocurrency is Polkadot.

In embodiments, the cryptocurrency is Atom.

In embodiments, the cryptocurrency is Tezos.

In embodiments, the blockchain is an Ethereum blockchain.

In embodiments, the blockchain is a Neo blockchain.

In embodiments, the method may further comprise: (i) notifying, by the digital asset exchange system, each digital asset address of the first set of the digital asset addresses of each respective transfer of stable value digital asset tokens to each respective digital asset address of the first set of digital asset addresses.

In embodiments, the digital asset first token is a security registered with a government authority.

In embodiments, the digital asset first token is a debt security and the electronic payments are interest.

In embodiments, the digital asset first token is an equity security and the electronic payments are dividends.

In embodiments, the digital asset first token is secured by intellectual property rights and the electronic payments are royalties.

In embodiments, the peer-to-peer network is based on a mathematical protocol for proof of work.

In embodiments, the peer-to-peer network is based on a mathematical protocol for proof of stake.

In embodiments, the peer-to-peer network is based on a cryptographic mathematical protocol.

In embodiments, a method may further comprise an additional step of publishing, by the digital asset exchange system to a side ledger, the transaction instructions associated with crediting the respective payment amount of stable value digital asset tokens to each respective digital asset address of the first set of digital asset addresses, and wherein the publishing step (g) includes publishing the transaction instructions from the side ledger to the distributed asset ledger periodically or aperiodically.

In embodiments, the method may further comprise steps of: (i) receiving, at the digital asset first token issuer system, from at least one digital asset first token holder, a payment request prior to the obtaining step (c), the payment request including: (9) the digital asset address of the digital asset first token holder; and (10) a request to transfer a payment amount of stable value digital asset tokens to the digital asset address of the digital asset first token holder; and (j) confirming, at the digital asset first token issuer system, that: (1) the digital asset address of the digital asset first token holder is valid; (2) the digital asset first token amount of digital asset first tokens associated with the address of the digital asset first token holder is more than zero; and (3) the digital asset first token holder is entitled to payment; and (k) generating, at the digital asset first token issuer system, the first request based at least in part on the payment request when the digital asset address of the at least one digital asset first token holder is valid, the digital asset first token amount of digital asset first tokens associated with the digital asset address of the at least one digital asset first token holder is more than zero and the at least one digital asset first token holder is entitled to payment.

In embodiments, the first set of one or more computer readable media associated with the digital asset first token issuer system is operably connected to a node of the plurality of geographically distributed computer systems in the peer-to-peer network in the form of the blockchain, wherein the node is maintained by the digital asset first token issuer.

In embodiments, the digital asset first token database is maintained and stored on the plurality of geographically distributed computer systems in the peer-to-peer network.

In embodiments, the digital asset first token database is maintained on a sidechain, separate from the peer-to-peer network, wherein information on the sidechain is published and stored on the peer-to-peer network periodically or aperiodically.

In embodiments, the generating step (f) includes generating, by the digital asset exchange system, transaction instructions for the first sum of stable value digital asset tokens by updating the stable value digital asset token database to reserve stable value digital asset tokens in the amount of the first sum.

In embodiments, the payment amount relates to a dividend to be paid based on ownership of each digital asset first token.

In embodiments, the payment amount relates to a royalty to be paid based on ownership of each digital asset first token.

In embodiments, the payment amount relates to interest to be paid based on ownership of each digital asset first token.

In embodiments, the peer-to-peer network uses a byzantine fault tolerance protocol as a consensus mechanism.

In embodiments, a method of issuing electronic payments using an amount of stable value digital asset tokens may comprise the steps of: (a) providing a digital asset first token database stored on a first set of one or more computer readable media associated with a digital asset first token issuer system associated with a digital asset first token issuer, wherein the digital asset first token database comprising a log of digital asset first tokens including: (i) a first set of digital asset addresses, each respective digital asset address of the first set of digital asset addresses tied to a distributed transaction ledger maintained by a plurality of geographically distributed computer systems in a peer-to-peer network in the form of a blockchain, the first set of digital asset addresses including a first respective digital asset address for each respective digital asset first token holder; and (ii) a respective digital asset first token amount associated with each respective first digital asset address; (b) providing a stable value digital asset token database stored on the distributed transaction ledger maintained by the plurality of geographically distributed computer systems in the peer-to-peer network, the stable value digital asset token database comprising a log of stable value digital asset token including: (i) a second set of digital asset addresses, each respective digital asset address of the second set of digital asset addresses tied to the distributed transaction ledger maintained by the plurality of geographically distributed computer systems in the peer-to-peer network, the second set of digital asset addresses including a second respective digital asset address for each respective stable value digital asset token holder; and (ii) a respective stable value digital asset token amount for each second respective stable value digital asset token address associated with a respective stable value digital asset token holder, wherein the stable value digital asset token stable value digital asset tokens are issued by a stable value digital asset token issuer; (c) obtaining, by a digital asset token issuer system associated with a digital asset token issuer, a first sum of stable value digital asset tokens in a first designated public address associated with the blockchain, wherein the first sum of stable value digital asset tokens are backed by a second amount of currency maintained by a custodian based on a fixed ratio of the stable value digital asset token to the currency, and wherein the first designated public address corresponds to a first designated public key and a corresponding first designated private key; (d) accessing, by the digital asset token issuer system, the digital asset first token database to determine: (i) each respective digital asset address of the first set of digital asset addresses for each respective digital asset first token holder; and (ii) the respective digital asset first token amount associated with each respective digital asset address; (e) determining a respective payment amount in stable value digital asset tokens to be made to each respective digital asset address of the first set of digital asset addresses based at least in part on the first sum of stable value digital asset tokens and the respective digital asset first token amount associated with each respective digital asset address of the first set of digital asset addresses; (f) generating, by the digital asset token issuer system, transaction instructions to transfer the respective payment amount of stable value digital asset tokens from the designated public address to each respective digital asset address of the first set of digital asset addresses with a digital signature based on the first designated private key; (g) publishing, by the digital asset token issuer system to the blockchain, the transaction instructions, wherein the plurality of geographically distributed computer systems implement the transaction instructions to transfer the respective payment amount of stable value digital asset tokens to each respective digital asset address of the first set of digital asset addresses, where ownership of each digital asset first token remains the same; and (h) confirming, by the digital asset token issuer system, that each digital asset address of the first set of the digital asset addresses received the determined respective payment amount in stable value digital asset tokens based on reference to the blockchain.

In embodiments, the currency is a fiat currency.

In embodiments, the fiat currency is U.S. dollar.

In embodiments, the fixed ratio is one stable value digital asset token for 1 U.S. dollar.

In embodiments, the fixed ratio is 100 stable value digital asset tokens for one U.S. dollar.

In embodiments, the fiat currency is GB pound.

In embodiments, the fiat currency is SG dollar.

In embodiments, the fiat currency is EUR.

In embodiments, the fiat currency is HK dollar.

In embodiments, the fiat currency is Canadian dollar.

In embodiments, the fiat currency is Australian dollar.

In embodiments, the fiat currency is Yen.

In embodiments, the currency is a cryptocurrency.

In embodiments, the cryptocurrency is Bitcoin.

In embodiments, the cryptocurrency is Litecoin.

In embodiments, the cryptocurrency is Bitcoin Cash.

In embodiments, the cryptocurrency is Filecoin.

In embodiments, the cryptocurrency is Zcash.

In embodiments, the cryptocurrency is Stellar.

In embodiments, the cryptocurrency is Polkadot.

In embodiments, the cryptocurrency is Atom.

In embodiments, the cryptocurrency is Tezos.

In embodiments, the blockchain is an Ethereum blockchain.

In embodiments, the blockchain is a Neo blockchain.

In embodiments, the method may further comprise: (i) notifying, by the digital asset token issuer system, each digital asset address of the first set of the digital asset addresses of each respective transfer of stable value digital asset tokens to each respective digital asset address of the first set of digital asset addresses.

In embodiments, the digital asset first token is a security registered with a government authority.

In embodiments, the digital asset first token is an equity security and the electronic payments are dividends.

In embodiments, the digital asset first token is secured by intellectual property rights and the electronic payments are royalties.

In embodiments, the peer-to-peer network is based on a mathematical protocol for proof of work.

In embodiments, the peer-to-peer network is based on a mathematical protocol for proof of stake.

In embodiments, the peer-to-peer network is based on a cryptographic mathematical protocol.

In embodiments, the method may further comprise an additional step of publishing, by the digital asset token issuer system to a side ledger, the transaction instructions associated with crediting the respective payment amount of stable value digital asset tokens to each respective digital asset address of the first set of digital asset addresses, and wherein the publishing step (g) includes publishing the transaction instructions from the side ledger to the distributed asset ledger periodically or aperiodically.

In embodiments, the method may further comprise steps of: (i) receiving, at the digital asset first token issuer system, from at least one digital asset first token holder, a payment request prior to the obtaining step (c), the payment request including: (11) the digital asset address of the digital asset first token holder; and (12) a request to transfer a payment amount of stable value digital asset tokens to the digital asset address of the digital asset first token holder; and (j) confirming, at the digital asset first token issuer system, that: (1) the digital asset address of the digital asset first token holder is valid; (2) the digital asset first token amount of digital asset first tokens associated with the address of the digital asset first token holder is more than zero; and (3) the digital asset first token holder is entitled to payment; and (k) generating, at the digital asset first token issuer system, the first request based at least in part on the payment request when the digital asset address of the at least one digital asset first token holder is valid, the digital asset first token amount of digital asset first tokens associated with the digital asset address of the at least one digital asset first token holder is more than zero and the at least one digital asset first token holder is entitled to payment.

In embodiments, the first set of one or more computer readable media associated with the digital asset first token issuer system is operably connected to a node of the plurality of geographically distributed computer systems in the peer-to-peer network in the form of the blockchain, wherein the node is maintained by the digital asset first token issuer.

In embodiments, the digital asset first token database is maintained and stored on the plurality of geographically distributed computer systems in the peer-to-peer network.

In embodiments, the digital asset first token database is maintained on a sidechain, separate from the peer-to-peer network, wherein information on the sidechain is published and stored on the peer-to-peer network periodically or aperiodically.

In embodiments, the generating step (f) includes generating, by the digital asset token issuer system, transaction instructions for the first sum of stable value digital asset tokens by updating the stable value digital asset token database to reserve stable value digital asset tokens in the amount of the first sum.

In embodiments, the payment amount relates to a dividend to be paid based on ownership of each digital asset first token.

In embodiments, the payment amount relates to a royalty to be paid based on ownership of each digital asset first token.

In embodiments, the payment amount relates to interest to be paid based on ownership of each digital asset first token.

In embodiments, the peer-to-peer network uses a byzantine fault tolerance protocol as a consensus mechanism.

In embodiments, a method of issuing electronic payments using an amount of stable value digital asset tokens may comprise the steps of: (a) obtaining, by an administrator system associated with an administrator, a first sum of stable value digital asset tokens in a first designated public address associated with a first blockchain, wherein the first sum of stable value digital asset tokens are backed by a second amount of a second digital asset maintained by a custodian based on a fixed ratio of the stable value digital asset token to the second digital asset, wherein the first designated public address corresponds to a first designated public key and a corresponding first designated private key; wherein the stable value digital asset token is maintained in a stable value digital asset token database stored on a first distributed transaction ledger maintained in the form of the first blockchain by a plurality of geographically distributed computer systems in a first blockchain network; wherein the second digital asset is maintained in a second digital asset database stored on a second distributed transaction ledger maintained in the form of a second blockchain by a plurality of geographically distributed computer systems in a second blockchain network; the stable value digital asset token database comprising a log of stable value digital asset tokens including: (i) a first set of digital asset addresses, each respective digital asset address of the first set of digital asset addresses in the first distributed transaction ledger maintained by the plurality of geographically distributed computer systems in the first blockchain network, the first set of digital asset addresses including a first respective digital asset address for each respective stable value digital asset first token holder; and (ii) a respective digital asset first token amount for each first respective stable value digital asset token address associated with a respective stable value digital asset token holder, wherein the stable value digital asset tokens are issued by a stable value digital asset token issuer; (b) obtaining, by the administrator system, (A) each respective digital asset address of a second set of digital asset addresses for each respective digital asset first token holder of a plurality of digital asset first token holders; and (B) a respective digital asset first token amount associated with each respective digital asset address of the second set of digital asset addresses; from a digital asset first token database stored on a second set of one or more computer readable media, the one or more computer readable media associated with a digital asset first token issuer system associated with a digital asset first token issuer, wherein the digital asset first token database comprises a log of digital asset first tokens including: (i) the second set of digital asset addresses, each respective digital asset address of the second set of digital asset addresses in the distributed transaction ledger in the form of the blockchain maintained by the plurality of geographically distributed computer systems in the first blockchain network, the second set of digital asset addresses including a second respective digital asset address for each respective stable value digital asset token holder; and (ii) the respective digital asset first token amount associated with each respective second digital asset address; (c) determining, by the administrator system, a respective payment amount in stable value digital asset tokens to be made to each respective digital asset address of the second set of digital asset addresses wherein the payment amount is determined on a pro rata basis with respect to a sum of the respective digital asset first token amounts for the second set of digital asset addresses; (d) generating, by the administrator system, transaction instructions to transfer the respective payment amount of stable value digital asset tokens from the designated public address to each respective digital asset address of the second set of digital asset addresses with a digital signature based on the first designated private key; (e) publishing, by the administrator system to the first blockchain, the transaction instructions, wherein the plurality of geographically distributed computer systems implement the transaction instructions to transfer the respective payment amount of stable value digital asset tokens to each respective digital asset address of the second set of digital asset addresses; and (f) confirming, by the administrator system, that each digital asset address of the second set of the digital asset addresses received the determined respective payment amount in stable value digital asset tokens based on reference to the blockchain and that the respective digital asset first token amount for each digital asset address of the second set of digital asset address has not changed.

In embodiments, the blockchain is an Ethereum blockchain.

In embodiments, the blockchain is a Bitcoin blockchain.

In embodiments, the method may further comprise: (g) notifying, by the administrator system, each digital asset address of the second set of the digital asset addresses of each respective transfer of stable value digital asset tokens to each respective digital asset address of the second set of digital asset addresses.

In embodiments, the blockchain is a Stellar blockchain.

In embodiments, the administrator is a regulated digital asset exchange.

In embodiments, the digital asset first token is a security registered with a government authority.

In embodiments, the digital asset first token is a debt security and the electronic payments are interest.

In embodiments, the digital asset first token is an equity security and the electronic payments are dividends.

In embodiments, the digital asset first token is secured by intellectual property rights and the electronic payments are royalties.

In embodiments, the first blockchain is based on a mathematical protocol for proof of work.

In embodiments, the mathematical protocol is open source.

In embodiments, the first blockchain is based on a mathematical protocol for proof of stake.

In embodiments, the mathematical protocol is open source.

In embodiments, the first blockchain is based on a cryptographic mathematical protocol.

In embodiments, the method may further comprise a step of publishing, by the administrator system to a side ledger, the transaction instructions associated with transferring the respective payment amount of stable value digital asset tokens to each respective digital asset address of the second set of digital asset addresses and the publishing step (e) includes publishing the transaction instructions from the side ledger to the distributed asset ledger periodically or aperiodically.

In embodiments, the method may further comprise the steps of: (g) receiving, at the digital asset first token issuer system, from at least one digital asset first token holder, a payment request prior to the obtaining step (a), the payment request including: (i) the digital asset address of the digital asset first token holder; and (ii) a request to transfer a payment amount of stable value digital asset tokens to the digital asset address of the digital asset first token holder; and (h) confirming, at the digital asset first token issuer system, that: (i) the digital asset address of the digital asset first token holder is valid; (ii) the digital asset first token amount of digital asset first tokens associated with the digital address of the digital asset first token holder is more than zero; and (iii) the digital asset first token holder is entitled to payment.

In embodiments, the digital asset first token database is maintained and stored on the plurality of geographically distributed computer systems in the first blockchain network.

In embodiments, the digital asset first token database is maintained on a sidechain, separate from the blockchain network, wherein information on the sidechain is published and stored on the blockchain network periodically or aperiodically.

In embodiments, the generating step (d) includes generating, by the administrator system, transaction instructions for the first sum of stable value digital asset tokens by updating the stable value digital asset token database to reserve stable value digital asset tokens in the amount of the first sum.

In embodiments, the payment amount relates to a dividend to be paid based on ownership of each digital asset first token.

In embodiments, the payment amount relates to a royalty to be paid based on ownership of each digital asset first token.

In embodiments, the payment amount relates to interest to be paid based on ownership of each digital asset first token.

In embodiments, the first blockchain network uses a byzantine fault tolerance protocol as a consensus mechanism.

In embodiments, the second digital asset is Bitcoin.

In embodiments, the second digital asset is Bitcoin Cash.

In embodiments, the second digital asset is Stellar.

In embodiments, the second digital asset is Filecoin.

In embodiments, the second digital asset is Litecoin.

In embodiments, the second digital asset is Tezos.

In embodiments, the second digital asset is Zcash.

In embodiments, the second digital asset is Polkadot.

In embodiments, the second digital asset is Atom.

In embodiments, the digital asset stable value tokens are issued by the stable value digital asset token issuer through one or more nodes associated with the stable value digital asset token issuer.

In embodiments, a method of issuing electronic payments using an amount of stable value digital asset tokens may comprise the steps of: (a) obtaining, by a digital asset exchange system associated with a digital asset exchange, a first sum of stable value digital asset tokens in a first designated public address associated with a first blockchain, wherein the first sum of stable value digital asset tokens are backed by a second amount of a second digital asset maintained by a custodian based on a fixed ratio of the stable value digital asset token to the second digital asset, wherein the first designated public address corresponds to a first designated public key and a corresponding first designated private key; wherein the stable value digital asset token is maintained in a stable value digital asset token database stored on a first distributed transaction ledger maintained in the form of the first blockchain by a plurality of geographically distributed computer systems in a first blockchain network; wherein the second digital asset is maintained in a second digital asset database stored on a second distributed transaction ledger maintained in the form of a second blockchain by a plurality of geographically distributed computer systems in a second blockchain network; the stable value digital asset token database comprising a log of stable value digital asset tokens including: (i) a first set of digital asset addresses, each respective digital asset address of the first set of digital asset addresses in the first distributed transaction ledger maintained by the plurality of geographically distributed computer systems in the first blockchain network, the first set of digital asset addresses including a first respective digital asset address for each respective stable value digital asset first token holder; and (ii) a respective digital asset first token amount for each first respective stable value digital asset token address associated with a respective stable value digital asset token holder, wherein the stable value digital asset tokens are issued by a stable value digital asset token issuer; (b) obtaining, by the digital asset exchange system, (A) each respective digital asset address of a second set of digital asset addresses for each respective digital asset first token holder of a plurality of digital asset first token holders; and (B) a respective digital asset first token amount associated with each respective digital asset address of the second set of digital asset addresses; from a digital asset first token database stored on a second set of one or more computer readable media, the one or more computer readable media associated with a digital asset first token issuer system associated with a digital asset first token issuer, wherein the digital asset first token database comprises a log of digital asset first tokens including: (i) the second set of digital asset addresses, each respective digital asset address of the second set of digital asset addresses in the distributed transaction ledger in the form of the blockchain maintained by the plurality of geographically distributed computer systems in the first blockchain network, the second set of digital asset addresses including a second respective digital asset address for each respective stable value digital asset token holder; and (ii) the respective digital asset first token amount associated with each respective second digital asset address; (c) determining, by the digital asset exchange system, a respective payment amount in stable value digital asset tokens to be made to each respective digital asset address of the second set of digital asset addresses wherein the payment amount is determined on a pro rata basis with respect to a sum of the respective digital asset first token amounts for the second set of digital asset addresses; (d) generating, by the digital asset exchange system, transaction instructions to transfer the respective payment amount of stable value digital asset tokens from the designated public address to each respective digital asset address of the second set of digital asset addresses with a digital signature based on the first designated private key; (e) publishing, by the digital asset exchange system to the first blockchain, the transaction instructions, wherein the plurality of geographically distributed computer systems implement the transaction instructions to transfer the respective payment amount of stable value digital asset tokens to each respective digital asset address of the second set of digital asset addresses; and (f) confirming, by the digital asset exchange system, that each digital asset address of the second set of the digital asset addresses received the determined respective payment amount in stable value digital asset tokens based on reference to the blockchain and that the respective digital asset first token amount for each digital asset address of the second set of digital asset address has not changed.

In embodiments, the blockchain is an Ethereum blockchain.

In embodiments, the blockchain is a Bitcoin blockchain.

In embodiments, the method may further comprise: (g) notifying, by the digital asset exchange system, each digital asset address of the second set of the digital asset addresses of each respective transfer of stable value digital asset tokens to each respective digital asset address of the second set of digital asset addresses.

In embodiments, the blockchain is a Stellar blockchain.

In embodiments, the digital asset exchange is a regulated digital asset exchange.

In embodiments, the digital asset first token is a security registered with a government authority.

In embodiments, the digital asset first token is a debt security and the electronic payments are interest.

In embodiments, the digital asset first token is an equity security and the electronic payments are dividends.

In embodiments, the digital asset first token is secured by intellectual property rights and the electronic payments are royalties.

In embodiments, the first blockchain is based on a mathematical protocol for proof of work.

In embodiments, the mathematical protocol is open source.

In embodiments, the first blockchain is based on a mathematical protocol for proof of stake.

In embodiments, the mathematical protocol is open source.

In embodiments, the first blockchain is based on a cryptographic mathematical protocol.

In embodiments, the method may further comprise a step of publishing, by the digital asset exchange system to a side ledger, the transaction instructions associated with transferring the respective payment amount of stable value digital asset tokens to each respective digital asset address of the second set of digital asset addresses and the publishing step (e) includes publishing the transaction instructions from the side ledger to the distributed asset ledger periodically or aperiodically.

In embodiments, the method may further comprise the steps of: (g) receiving, at the digital asset first token issuer system, from at least one digital asset first token holder, a payment request prior to the obtaining step (a), the payment request including: (i) the digital asset address of the digital asset first token holder; and (ii) a request to transfer a payment amount of stable value digital asset tokens to the digital asset address of the digital asset first token holder; and (h) confirming, at the digital asset first token issuer system, that: (i) the digital asset address of the digital asset first token holder is valid; (ii) the digital asset first token amount of digital asset first tokens associated with the digital address of the digital asset first token holder is more than zero; and (iii) the digital asset first token holder is entitled to payment.

In embodiments, the digital asset first token database is maintained and stored on the plurality of geographically distributed computer systems in the first blockchain network.

In embodiments, the digital asset first token database is maintained on a sidechain, separate from the blockchain network, wherein information on the sidechain is published and stored on the blockchain network periodically or aperiodically.

In embodiments, the generating step (d) includes generating, by the digital asset exchange system, transaction instructions for the first sum of stable value digital asset tokens by updating the stable value digital asset token database to reserve stable value digital asset tokens in the amount of the first sum.

In embodiments, the payment amount relates to a dividend to be paid based on ownership of each digital asset first token.

In embodiments, the payment amount relates to a royalty to be paid based on ownership of each digital asset first token.

In embodiments, the payment amount relates to interest to be paid based on ownership of each digital asset first token.

In embodiments, the first blockchain network uses a byzantine fault tolerance protocol as a consensus mechanism.

In embodiments, the second digital asset is Bitcoin.

In embodiments, the second digital asset is Bitcoin Cash.

In embodiments, the second digital asset is Stellar.

In embodiments, the second digital asset is Filecoin.

In embodiments, the second digital asset is Litecoin.

In embodiments, the second digital asset is Tezos.

In embodiments, the second digital asset is Zcash.

In embodiments, the second digital asset is Polkadot.

In embodiments, the second digital asset is Atom.

In embodiments, the digital asset stable value tokens are issued by the stable value digital asset token issuer through one or more nodes associated with the stable value digital asset token issuer.

In embodiments, a method of issuing electronic payments using an amount of stable value digital asset tokens may comprise the steps of: (a) obtaining, by a digital asset token issuer system associated with a digital asset token issuer, a first sum of stable value digital asset tokens in a first designated public address associated with a first blockchain, wherein the first sum of stable value digital asset tokens are backed by a second amount of a second digital asset maintained by a custodian based on a fixed ratio of the stable value digital asset token to the second digital asset, wherein the first designated public address corresponds to a first designated public key and a corresponding first designated private key; wherein the stable value digital asset token is maintained in a stable value digital asset token database stored on a first distributed transaction ledger maintained in the form of the first blockchain by a plurality of geographically distributed computer systems in a first blockchain network; wherein the second digital asset is maintained in a second digital asset database stored on a second distributed transaction ledger maintained in the form of a second blockchain by a plurality of geographically distributed computer systems in a second blockchain network; the stable value digital asset token database comprising a log of stable value digital asset tokens including: (i) a first set of digital asset addresses, each respective digital asset address of the first set of digital asset addresses in the first distributed transaction ledger maintained by the plurality of geographically distributed computer systems in the first blockchain network, the first set of digital asset addresses including a first respective digital asset address for each respective stable value digital asset first token holder; and (ii) a respective digital asset first token amount for each first respective stable value digital asset token address associated with a respective stable value digital asset token holder, wherein the stable value digital asset tokens are issued by a stable value digital asset token issuer; (b) obtaining, by the digital asset token issuer system, (A) each respective digital asset address of a second set of digital asset addresses for each respective digital asset first token holder of a plurality of digital asset first token holders; and (B) a respective digital asset first token amount associated with each respective digital asset address of the second set of digital asset addresses; from a digital asset first token database stored on a second set of one or more computer readable media, the one or more computer readable media associated with a digital asset first token issuer system associated with a digital asset first token issuer, wherein the digital asset first token database comprises a log of digital asset first tokens including: (i) the second set of digital asset addresses, each respective digital asset address of the second set of digital asset addresses in the distributed transaction ledger in the form of the blockchain maintained by the plurality of geographically distributed computer systems in the first blockchain network, the second set of digital asset addresses including a second respective digital asset address for each respective stable value digital asset token holder; and (ii) the respective digital asset first token amount associated with each respective second digital asset address; (c) determining, by the digital asset token issuer system, a respective payment amount in stable value digital asset tokens to be made to each respective digital asset address of the second set of digital asset addresses wherein the payment amount is determined on a pro rata basis with respect to a sum of the respective digital asset first token amounts for the second set of digital asset addresses; (d) generating, by the digital asset token issuer system, transaction instructions to transfer the respective payment amount of stable value digital asset tokens from the designated public address to each respective digital asset address of the second set of digital asset addresses with a digital signature based on the first designated private key; (e) publishing, by the digital asset token issuer system to the first blockchain, the transaction instructions, wherein the plurality of geographically distributed computer systems implement the transaction instructions to transfer the respective payment amount of stable value digital asset tokens to each respective digital asset address of the second set of digital asset addresses; and (f) confirming, by the digital asset token issuer system, that each digital asset address of the second set of the digital asset addresses received the determined respective payment amount in stable value digital asset tokens based on reference to the blockchain and that the respective digital asset first token amount for each digital asset address of the second set of digital asset address has not changed.

In embodiments, the blockchain is an Ethereum blockchain.

In embodiments, the blockchain is a Bitcoin blockchain.

In embodiments, the method may further comprise: (g) notifying, by the digital asset token issuer system, each digital asset address of the second set of the digital asset addresses of each respective transfer of stable value digital asset tokens to each respective digital asset address of the second set of digital asset addresses.

In embodiments, the blockchain is a Stellar blockchain.

In embodiments, the digital asset token issuer is a regulated digital asset exchange.

In embodiments, the digital asset first token is a security registered with a government authority.

In embodiments, the digital asset first token is a debt security and the electronic payments are interest.

In embodiments, the digital asset first token is an equity security and the electronic payments are dividends.

In embodiments, the digital asset first token is secured by intellectual property rights and the electronic payments are royalties.

In embodiments, the first blockchain is based on a mathematical protocol for proof of work.

In embodiments, the mathematical protocol is open source.

In embodiments, the first blockchain is based on a mathematical protocol for proof of stake.

In embodiments, the mathematical protocol is open source.

In embodiments, the first blockchain is based on a cryptographic mathematical protocol.

In embodiments, the method may further comprise a step of publishing, by the digital asset token issuer system to a side ledger, the transaction instructions associated with transferring the respective payment amount of stable value digital asset tokens to each respective digital asset address of the second set of digital asset addresses and the publishing step (e) includes publishing the transaction instructions from the side ledger to the distributed asset ledger periodically or aperiodically.

In embodiments, the method may further comprise the steps of: (g) receiving, at the digital asset first token issuer system, from at least one digital asset first token holder, a payment request prior to the obtaining step (a), the payment request including: (i) the digital asset address of the digital asset first token holder; and (ii) a request to transfer a payment amount of stable value digital asset tokens to the digital asset address of the digital asset first token holder; and (h) confirming, at the digital asset first token issuer system, that: (i) the digital asset address of the digital asset first token holder is valid; (ii) the digital asset first token amount of digital asset first tokens associated with the digital address of the digital asset first token holder is more than zero; and (iii) the digital asset first token holder is entitled to payment.

In embodiments, the digital asset first token database is maintained and stored on the plurality of geographically distributed computer systems in the first blockchain network.

In embodiments, the digital asset first token database is maintained on a sidechain, separate from the blockchain network, wherein information on the sidechain is published and stored on the blockchain network periodically or aperiodically.

In embodiments, the generating step (d) includes generating, by the digital asset token issuer system, transaction instructions for the first sum of stable value digital asset tokens by updating the stable value digital asset token database to reserve stable value digital asset tokens in the amount of the first sum.

In embodiments, the payment amount relates to a dividend to be paid based on ownership of each digital asset first token.

In embodiments, the payment amount relates to a royalty to be paid based on ownership of each digital asset first token.

In embodiments, the payment amount relates to interest to be paid based on ownership of each digital asset first token.

In embodiments, the first blockchain network uses a byzantine fault tolerance protocol as a consensus mechanism.

In embodiments, the second digital asset is Bitcoin.

In embodiments, the second digital asset is Bitcoin Cash.

In embodiments, the second digital asset is Stellar.

In embodiments, the second digital asset is Filecoin.

In embodiments, the second digital asset is Litecoin.

In embodiments, the second digital asset is Tezos.

In embodiments, the second digital asset is Zcash.

In embodiments, the second digital asset is Polkadot.

In embodiments, the second digital asset is Atom.

In embodiments, the digital asset stable value tokens are issued by the stable value digital asset token issuer through one or more nodes associated with the stable value digital asset token issuer.

In embodiments, a method of issuing electronic payments using an amount of stable value digital asset tokens may comprise the steps of: (a) obtaining, by an administrator system associated with an administrator, a first sum of stable value digital asset tokens in a first designated public address associated with a blockchain, wherein the first sum of stable value digital asset tokens are backed by a second sum of currency maintained by a custodian based on a fixed ratio of the stable value digital asset token to the currency, wherein the first designated public address corresponds to a first designated public key and a corresponding first designated private key; wherein the stable value digital asset token is maintained in a stable value digital asset token database stored on a distributed transaction ledger in the form of a blockchain associated with an underlying asset maintained by a plurality of geographically distributed computer systems in a blockchain network, the stable value digital asset token database comprising a log of stable value digital asset tokens including: (i) a first set of digital asset addresses, each respective digital asset address of the first set of digital asset addresses in the distributed transaction ledger maintained by the plurality of geographically distributed computer systems in the blockchain network, the first set of digital asset addresses including a first respective digital asset token address for each respective stable value digital asset token holder; (ii) a respective stable value digital asset token amount for each first respective stable value digital asset token address associated with a respective stable value digital asset token holder, wherein the stable value digital asset tokens are issued by a stable value digital asset token issuer; (b) obtaining, by the administrator system, (A) each respective digital asset address of a second set of digital asset addresses for each respective digital asset first token holder of a plurality of digital asset first token holders; and (B) a respective digital asset first token amount associated with each respective digital asset address of the second set of digital asset addresses; from a digital asset first token database stored on a second set of one or more computer readable media, the one or more computer readable media associated with a digital asset first token issuer system associated with a digital asset first token issuer, wherein the digital asset first token database comprises a log of digital asset first tokens including: (i) the second set of digital asset addresses, each respective digital asset address of the second set of digital asset addresses in the distributed transaction ledger in the form of the blockchain maintained by the plurality of geographically distributed computer systems in the blockchain network, the second set of digital asset addresses including a second respective digital asset address for each respective digital asset first token holder; and (ii) the respective digital asset first token amount associated with each respective second digital asset address; (c) determining, by the administrator system, a respective payment amount in stable value digital asset tokens to be made to each respective digital asset address of the second set of digital asset addresses based at least in part on the first sum of stable value digital asset tokens and the respective digital asset first token amount associated with each respective digital asset address of the second set of digital asset addresses wherein the payment amount is determined on a pro rata basis with respect to a sum of the respective digital asset first token amounts for the second set of digital asset addresses; (d) generating, by the administrator system, transaction instructions to transfer the respective payment amount of stable value digital asset tokens from the designated public address to each respective digital asset address of the second set of digital asset addresses with a digital signature based on the first designated private key; (e) publishing, by the administrator system to the blockchain, the transaction instructions, wherein the plurality of geographically distributed computer systems implement the transaction instructions to transfer the respective payment amount of stable value digital asset tokens to each respective digital asset address of the second set of digital asset addresses; (f) confirming, by the administrator system, that each digital asset address of the second set of the digital asset addresses received the determined respective payment amount in stable value digital asset tokens based on reference to the blockchain and that the respective digital asset first token amount for each digital asset address of the second set of digital asset address after publishing the transaction instructions is the same as the respective digital asset first token amount for each digital asset address of the second set of digital asset address after publishing the transaction instructions.

In embodiments, the blockchain is an Ethereum blockchain.

In embodiments, the blockchain is a Bitcoin blockchain.

In embodiments, the method may further comprise: (g) notifying, by the administrator system, each digital asset address of the second set of the digital asset addresses of each respective transfer of stable value digital asset tokens to each respective digital asset address of the second set of digital asset addresses.

In embodiments, the blockchain is a Stellar blockchain.

In embodiments, the administrator is a regulated digital asset exchange.

In embodiments, the digital asset security token is a security registered with a government authority.

In embodiments, the digital asset security token is a debt security and the electronic payments are interest.

In embodiments, the digital asset security token is an equity security and the electronic payments are dividends.

In embodiments, the digital asset security token is secured by intellectual property rights and the electronic payments are royalties.

In embodiments, the blockchain is based on a mathematical protocol for proof of work.

In embodiments, the mathematical protocol is open source.

In embodiments, the blockchain is based on a mathematical protocol for proof of stake.

In embodiments, the mathematical protocol is open source.

In embodiments, the blockchain is based on a cryptographic mathematical protocol.

In embodiments, the method may further comprise a step of publishing, by the administrator system to a side ledger, the transaction instructions associated with transferring the respective payment amount of stable value digital asset tokens to each respective digital asset address of the second set of digital asset addresses and the publishing step (e) includes publishing the transaction instructions from the side ledger to the distributed asset ledger periodically or aperiodically.

In embodiments, the method may further comprise steps of: (g) receiving, at the digital asset first token issuer system, from at least one digital asset first token holder, a payment request prior to the obtaining step (a), the payment request including: (i) the digital asset address of the digital asset first token holder; and (ii) a request to transfer a payment amount of stable value digital asset tokens to the digital asset address of the digital asset first token holder; and (h) confirming, at the digital asset first token issuer system, that: (i) the digital asset address of the digital asset first token holder is valid; (ii) the digital asset first token amount of digital asset first tokens associated with the address of the digital asset first token holder is more than zero; and (iii) the digital asset first token holder is entitled to payment.

In embodiments, the digital asset first token database is maintained and stored on the plurality of geographically distributed computer systems in the blockchain network.

In embodiments, the digital asset security token database is maintained on a sidechain, separate from the blockchain network, wherein information on the sidechain is published and stored on the blockchain network periodically or aperiodically.

In embodiments, the generating step (d) includes generating, by the administrator system, transaction instructions for the first sum of stable value digital asset tokens by updating the stable value digital asset token database to reserve stable value digital asset tokens in the amount of the first sum.

In embodiments, the payment amount relates to a dividend to be paid based on ownership of each digital asset first token.

In embodiments, the payment amount relates to a royalty to be paid based on ownership of each digital asset first token.

In embodiments, the payment amount relates to interest to be paid based on ownership of each digital asset first token.

In embodiments, the blockchain network uses a byzantine fault tolerance protocol as a consensus mechanism.

In embodiments, the currency is a fiat currency.

In embodiments, the fiat currency is US dollar.

In embodiments, the fiat currency is Euro.

In embodiments, the fiat currency is Yen.

In embodiments, the fiat currency is British Pound.

In embodiments, the fiat currency is Australian dollar.

In embodiments, the fiat currency is Canadian dollar.

In embodiments, the currency is cryptocurrency.

In embodiments, the currency is a cryptocurrency.

In embodiments, the cryptocurrency is Bitcoin.

In embodiments, the cryptocurrency is Litecoin.

In embodiments, the cryptocurrency is Bitcoin Cash.

In embodiments, the cryptocurrency is Filecoin.

In embodiments, the cryptocurrency is Zcash.

In embodiments, the cryptocurrency is Stellar.

In embodiments, the cryptocurrency is Tezos.

In embodiments, the digital asset stable value tokens are issued by the stable value digital asset token issuer through one or more nodes associated with the stable value digital asset token issuer.

In embodiments, a method of issuing electronic payments using an amount of stable value digital asset tokens may comprise the steps of: (a) obtaining, by a digital asset exchange system associated with a digital asset exchange, a first sum of stable value digital asset tokens in a first designated public address associated with a blockchain, wherein the first sum of stable value digital asset tokens are backed by a second sum of currency maintained by a custodian based on a fixed ratio of the stable value digital asset token to the currency, wherein the first designated public address corresponds to a first designated public key and a corresponding first designated private key; wherein the stable value digital asset token is maintained in a stable value digital asset token database stored on a distributed transaction ledger in the form of a blockchain associated with an underlying asset maintained by a plurality of geographically distributed computer systems in a blockchain network, the stable value digital asset token database comprising a log of stable value digital asset tokens including: (i) a first set of digital asset addresses, each respective digital asset address of the first set of digital asset addresses in the distributed transaction ledger maintained by the plurality of geographically distributed computer systems in the blockchain network, the first set of digital asset addresses including a first respective digital asset token address for each respective stable value digital asset token holder; (ii) a respective stable value digital asset token amount for each first respective stable value digital asset token address associated with a respective stable value digital asset token holder, wherein the stable value digital asset tokens are issued by a stable value digital asset token issuer; (b) obtaining, by the digital asset exchange system, (A) each respective digital asset address of a second set of digital asset addresses for each respective digital asset first token holder of a plurality of digital asset first token holders; and (B) a respective digital asset first token amount associated with each respective digital asset address of the second set of digital asset addresses; from a digital asset first token database stored on a second set of one or more computer readable media, the one or more computer readable media associated with a digital asset first token issuer system associated with a digital asset first token issuer, wherein the digital asset first token database comprises a log of digital asset first tokens including: (i) the second set of digital asset addresses, each respective digital asset address of the second set of digital asset addresses in the distributed transaction ledger in the form of the blockchain maintained by the plurality of geographically distributed computer systems in the blockchain network, the second set of digital asset addresses including a second respective digital asset address for each respective digital asset first token holder; and (ii) the respective digital asset first token amount associated with each respective second digital asset address; (c) determining, by the digital asset exchange system, a respective payment amount in stable value digital asset tokens to be made to each respective digital asset address of the second set of digital asset addresses based at least in part on the first sum of stable value digital asset tokens and the respective digital asset first token amount associated with each respective digital asset address of the second set of digital asset addresses wherein the payment amount is determined on a pro rata basis with respect to a sum of the respective digital asset first token amounts for the second set of digital asset addresses; (d) generating, by the digital asset exchange system, transaction instructions to transfer the respective payment amount of stable value digital asset tokens from the designated public address to each respective digital asset address of the second set of digital asset addresses with a digital signature based on the first designated private key; (e) publishing, by the digital asset exchange system to the blockchain, the transaction instructions, wherein the plurality of geographically distributed computer systems implement the transaction instructions to transfer the respective payment amount of stable value digital asset tokens to each respective digital asset address of the second set of digital asset addresses; (f) confirming, by the digital asset exchange system, that each digital asset address of the second set of the digital asset addresses received the determined respective payment amount in stable value digital asset tokens based on reference to the blockchain and that the respective digital asset first token amount for each digital asset address of the second set of digital asset address after publishing the transaction instructions is the same as the respective digital asset first token amount for each digital asset address of the second set of digital asset address after publishing the transaction instructions.

In embodiments, the blockchain is an Ethereum blockchain.

In embodiments, the blockchain is a Bitcoin blockchain.

In embodiments, the method may further comprise: (g) notifying, by the digital asset exchange system, each digital asset address of the second set of the digital asset addresses of each respective transfer of stable value digital asset tokens to each respective digital asset address of the second set of digital asset addresses.

In embodiments, the blockchain is a Stellar blockchain.

In embodiments, the digital asset exchange is a regulated digital asset exchange.

In embodiments, the digital asset security token is a security registered with a government authority.

In embodiments, the digital asset security token is a debt security and the electronic payments are interest.

In embodiments, the digital asset security token is an equity security and the electronic payments are dividends.

In embodiments, the digital asset security token is secured by intellectual property rights and the electronic payments are royalties.

In embodiments, the blockchain is based on a mathematical protocol for proof of work.

In embodiments, the mathematical protocol is open source.

In embodiments, the blockchain is based on a mathematical protocol for proof of stake.

In embodiments, the mathematical protocol is open source.

In embodiments, the blockchain is based on a cryptographic mathematical protocol.

In embodiments, the method may further comprise a step of publishing, by the digital asset exchange system to a side ledger, the transaction instructions associated with transferring the respective payment amount of stable value digital asset tokens to each respective digital asset address of the second set of digital asset addresses and the publishing step (e) includes publishing the transaction instructions from the side ledger to the distributed asset ledger periodically or aperiodically.

In embodiments, the method may further comprise steps of: (g) receiving, at the digital asset first token issuer system, from at least one digital asset first token holder, a payment request prior to the obtaining step (a), the payment request including: (i) the digital asset address of the digital asset first token holder; and (ii) a request to transfer a payment amount of stable value digital asset tokens to the digital asset address of the digital asset first token holder; and (h) confirming, at the digital asset first token issuer system, that: (i) the digital asset address of the digital asset first token holder is valid; (ii) the digital asset first token amount of digital asset first tokens associated with the address of the digital asset first token holder is more than zero; and (iii) the digital asset first token holder is entitled to payment.

In embodiments, the digital asset first token database is maintained and stored on the plurality of geographically distributed computer systems in the blockchain network.

In embodiments, the digital asset security token database is maintained on a sidechain, separate from the blockchain network, wherein information on the sidechain is published and stored on the blockchain network periodically or aperiodically.

In embodiments, the generating step (d) includes generating, by the digital asset exchange system, transaction instructions for the first sum of stable value digital asset tokens by updating the stable value digital asset token database to reserve stable value digital asset tokens in the amount of the first sum.

In embodiments, the payment amount relates to a dividend to be paid based on ownership of each digital asset first token.

In embodiments, the payment amount relates to a royalty to be paid based on ownership of each digital asset first token.

In embodiments, the payment amount relates to interest to be paid based on ownership of each digital asset first token.

In embodiments, the blockchain network uses a byzantine fault tolerance protocol as a consensus mechanism.

In embodiments, the currency is a fiat currency.

In embodiments, the fiat currency is US dollar.

In embodiments, the fiat currency is Euro.

In embodiments, the fiat currency is Yen.

In embodiments, the fiat currency is British Pound.

In embodiments, the fiat currency is Australian dollar.

In embodiments, the fiat currency is Canadian dollar.

In embodiments, the currency is cryptocurrency.

In embodiments, the currency is a cryptocurrency.

In embodiments, the cryptocurrency is Bitcoin.

In embodiments, the cryptocurrency is Litecoin.

In embodiments, the cryptocurrency is Bitcoin Cash.

In embodiments, the cryptocurrency is Filecoin.

In embodiments, the cryptocurrency is Zcash.

In embodiments, the cryptocurrency is Stellar.

In embodiments, the cryptocurrency is Tezos.

In embodiments, the digital asset stable value tokens are issued by the stable value digital asset token issuer through one or more nodes associated with the stable value digital asset token issuer.

In embodiments, a method of issuing electronic payments using an amount of stable value digital asset tokens mat comprise the steps of: (a) obtaining, by a digital asset token issuer system associated with a digital asset token issuer, a first sum of stable value digital asset tokens in a first designated public address associated with a blockchain, wherein the first sum of stable value digital asset tokens are backed by a second sum of currency maintained by a custodian based on a fixed ratio of the stable value digital asset token to the currency, wherein the first designated public address corresponds to a first designated public key and a corresponding first designated private key; wherein the stable value digital asset token is maintained in a stable value digital asset token database stored on a distributed transaction ledger in the form of a blockchain associated with an underlying asset maintained by a plurality of geographically distributed computer systems in a blockchain network, the stable value digital asset token database comprising a log of stable value digital asset tokens including: (i) a first set of digital asset addresses, each respective digital asset address of the first set of digital asset addresses in the distributed transaction ledger maintained by the plurality of geographically distributed computer systems in the blockchain network, the first set of digital asset addresses including a first respective digital asset token address for each respective stable value digital asset token holder; (ii) a respective stable value digital asset token amount for each first respective stable value digital asset token address associated with a respective stable value digital asset token holder, wherein the stable value digital asset tokens are issued by a stable value digital asset token issuer; (b) obtaining, by the digital asset token issuer system, (A) each respective digital asset address of a second set of digital asset addresses for each respective digital asset first token holder of a plurality of digital asset first token holders; and (B) a respective digital asset first token amount associated with each respective digital asset address of the second set of digital asset addresses; from a digital asset first token database stored on a second set of one or more computer readable media, the one or more computer readable media associated with a digital asset first token issuer system associated with a digital asset first token issuer, wherein the digital asset first token database comprises a log of digital asset first tokens including: (i) the second set of digital asset addresses, each respective digital asset address of the second set of digital asset addresses in the distributed transaction ledger in the form of the blockchain maintained by the plurality of geographically distributed computer systems in the blockchain network, the second set of digital asset addresses including a second respective digital asset address for each respective digital asset first token holder; and (ii) the respective digital asset first token amount associated with each respective second digital asset address; (c) determining, by the digital asset token issuer system, a respective payment amount in stable value digital asset tokens to be made to each respective digital asset address of the second set of digital asset addresses based at least in part on the first sum of stable value digital asset tokens and the respective digital asset first token amount associated with each respective digital asset address of the second set of digital asset addresses wherein the payment amount is determined on a pro rata basis with respect to a sum of the respective digital asset first token amounts for the second set of digital asset addresses: (d) generating, by the digital asset token issuer system, transaction instructions to transfer the respective payment amount of stable value digital asset tokens from the designated public address to each respective digital asset address of the second set of digital asset addresses with a digital signature based on the first designated private key; (e) publishing, by the digital asset token issuer to the blockchain, the transaction instructions, wherein the plurality of geographically distributed computer systems implement the transaction instructions to transfer the respective payment amount of stable value digital asset tokens to each respective digital asset address of the second set of digital asset addresses; (f) confirming, by the digital asset token issuer system, that each digital asset address of the second set of the digital asset addresses received the determined respective payment amount in stable value digital asset tokens based on reference to the blockchain and that the respective digital asset first token amount for each digital asset address of the second set of digital asset address after publishing the transaction instructions is the same as the respective digital asset first token amount for each digital asset address of the second set of digital asset address after publishing the transaction instructions.

In embodiments, the blockchain is an Ethereum blockchain.

In embodiments, the blockchain is a Bitcoin blockchain.

In embodiments, the method may further comprise: (g) notifying, by the digital asset token issuer system, each digital asset address of the second set of the digital asset addresses of each respective transfer of stable value digital asset tokens to each respective digital asset address of the second set of digital asset addresses.

In embodiments, the blockchain is a Stellar blockchain.

In embodiments, the digital asset token issuer is a regulated digital asset exchange.

In embodiments, the digital asset security token is a security registered with a government authority.

In embodiments, the digital asset security token is a debt security and the electronic payments are interest.

In embodiments, the digital asset security token is an equity security and the electronic payments are dividends.

In embodiments, the digital asset security token is secured by intellectual property rights and the electronic payments are royalties.

In embodiments, the blockchain is based on a mathematical protocol for proof of work.

In embodiments, the mathematical protocol is open source.

In embodiments, the blockchain is based on a mathematical protocol for proof of stake.

In embodiments, the mathematical protocol is open source.

In embodiments, the blockchain is based on a cryptographic mathematical protocol.

In embodiments, the method may further comprise a step of publishing, by the digital asset token issuer system to a side ledger, the transaction instructions associated with transferring the respective payment amount of stable value digital asset tokens to each respective digital asset address of the second set of digital asset addresses and the publishing step (e) includes publishing the transaction instructions from the side ledger to the distributed asset ledger periodically or aperiodically.

In embodiments, method may further comprise the steps of: (g) receiving, at the digital asset first token issuer system, from at least one digital asset first token holder, a payment request prior to the obtaining step (a), the payment request including: (i) the digital asset address of the digital asset first token holder; and (ii) a request to transfer a payment amount of stable value digital asset tokens to the digital asset address of the digital asset first token holder; and (h) confirming, at the digital asset first token issuer system, that: (i) the digital asset address of the digital asset first token holder is valid; (ii) the digital asset first token amount of digital asset first tokens associated with the address of the digital asset first token holder is more than zero; and (iii) the digital asset first token holder is entitled to payment.

In embodiments, the digital asset first token database is maintained and stored on the plurality of geographically distributed computer systems in the blockchain network.

In embodiments, the digital asset security token database is maintained on a sidechain, separate from the blockchain network, wherein information on the sidechain is published and stored on the blockchain network periodically or aperiodically.

In embodiments, the generating step (d) includes generating, by the digital asset token issuer system, transaction instructions for the first sum of stable value digital asset tokens by updating the stable value digital asset token database to reserve stable value digital asset tokens in the amount of the first sum.

In embodiments, the payment amount relates to a dividend to be paid based on ownership of each digital asset first token.

In embodiments, the payment amount relates to a royalty to be paid based on ownership of each digital asset first token.

In embodiments, the payment amount relates to interest to be paid based on ownership of each digital asset first token.

In embodiments, the blockchain network uses a byzantine fault tolerance protocol as a consensus mechanism.

In embodiments, the currency is a fiat currency.

In embodiments, the fiat currency is US dollar.

In embodiments, the fiat currency is Euro.

In embodiments, the fiat currency is Yen.

In embodiments, the fiat currency is British Pound.

In embodiments, the fiat currency is Australian dollar.

In embodiments, the fiat currency is Canadian dollar.

In embodiments, the currency is cryptocurrency.

In embodiments, the currency is a cryptocurrency.

In embodiments, the cryptocurrency is Bitcoin.

In embodiments, the cryptocurrency is Litecoin.

In embodiments, the cryptocurrency is Bitcoin Cash.

In embodiments, the cryptocurrency is Filecoin.

In embodiments, the cryptocurrency is Zcash.

In embodiments, the cryptocurrency is Stellar.

In embodiments, the cryptocurrency is Tezos.

In embodiments, the digital asset stable value tokens are issued by the stable value digital asset token issuer through one or more nodes associated with the stable value digital asset token issuer.

Non-Fungible Tokens

In embodiments, a non-fungible token may be provided on a peer-to-peer distributed network in the form of a blockchain (or other distributed networks, e.g., a peer-to-peer network). Examples of non-fungible tokens include: CRYPTOKITTIES, CRYPTOFIGHTERS, DECENTRALAND, ETHERBOTS, ETHERMON, RARE PEPPES, SPELLS OF GENESIS, CRAFTY, SUPERARRE, TERRA0, UNICO, EVERDRAGON, CRYPTO BASEBALL, MYCRYPTOHEROES, and/or MARBLECARD, to name a few. In embodiments, non-fungible tokens, (e.g., CRYTPOKITTIES) may be transferable and accounted for as a digital asset token on an underlying blockchain network (e.g., the ETHEREUM Network). In embodiments, a first non-fungible token (e.g., a First CryptoKitty) may have attributes (e.g., characteristics of a non-fungible token) that are different from a second non-fungible token (e.g., a Second CryptoKitty), even if both are the same type of non-fungible token (e.g., a CryptoKitty). For example, the First CryptoKitty may be a striped CryptoKitty, while the Second CryptoKitty may be a droopy-eyed CryptoKitty. In embodiments, the attributes of each non-fungible token may be customizable. In embodiments, programming modules may be added to and/or transferred with programming modules associated with specific tokens. By way of illustration, in embodiments, a first token, e.g., a Cryptokitten Tiger, may purchase a second token, e.g., a digital "hat," that will then become associated with the first token to be a Tiger with a hat, and remains with the first token when transferred. In embodiments, the second token may be separately transferable, such as for example, the second token may be sold to the holder of a third token (e.g., a Black Cryptokitten) so that the second token is combined with the third token to be a Black Cryptokitten with the hat. In embodiments, when transferred, the second token will no longer be associated with the first token (e.g., the Cryptokitten Tiger will no longer wear the hat). In embodiments, even when transferred, the second token may also remain associated with the first token in addition to the third token (e.g., both the Cryptokitten Tiger and the Black Cryptokitten are wearing the same hat).

In embodiments, one or more individuals who are purchasing a non-fungible token, may not have an address on, or may not be familiar with, the blockchain 6803 or would prefer not to interact directly with the blockchain 6803. In embodiments, a non-fungible token platform may provide one or more customers with the opportunity to purchase one or more non-fungible tokens without first having a public address associated with the blockchain 6803. For example, a first user operating a user device may access a non-fungible token platform. In embodiments, the non-fungible token platform may be accessed via a browser at a URL address on the Internet. In embodiments, the non-fungible token platform may be accessed via a downloadable application on a user device, such as a mobile phone, tablet, computer, to name a few. The non-fungible token platform, may, in embodiments, be accessed via a graphical user interface displayed on the user device associated with the first user. An exemplary graphical user interface is shown in connection with FIG. 52A. Once accessed, the first user may log-in and/or create an account with a digital asset exchange system associated with the platform. Once the first user has logged in and been authenticated, the first user, via the first user device, may browse one or more non-fungible tokens available.

Figure 52A:
FIGS. 52A-52D illustrate screenshots showing exemplary embodiments of purchasing a non-fungible token in accordance with exemplary embodiments of the present invention.
Figure 52B:
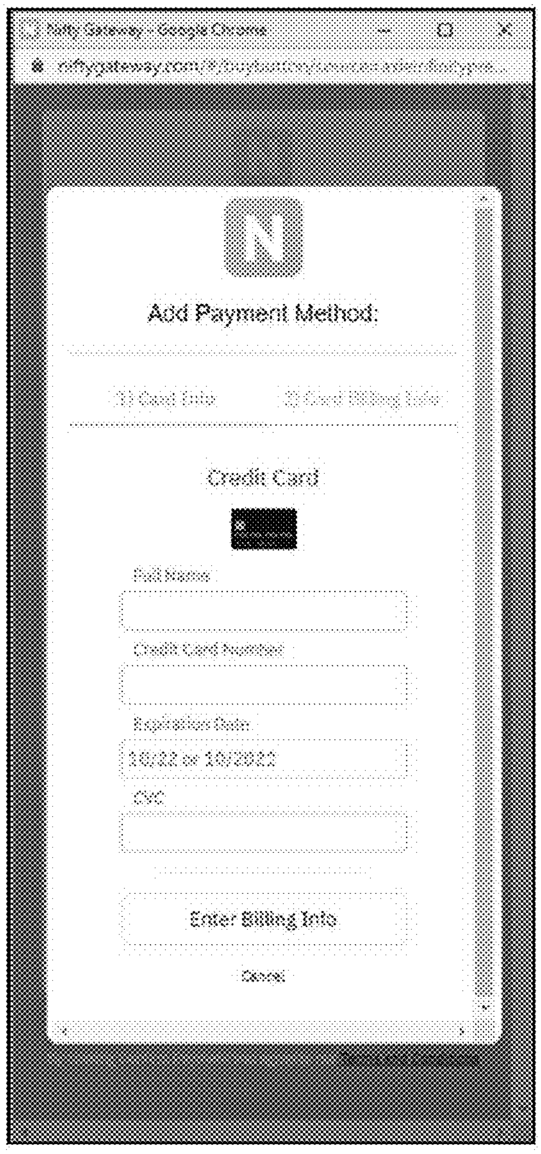
Figure 52C:
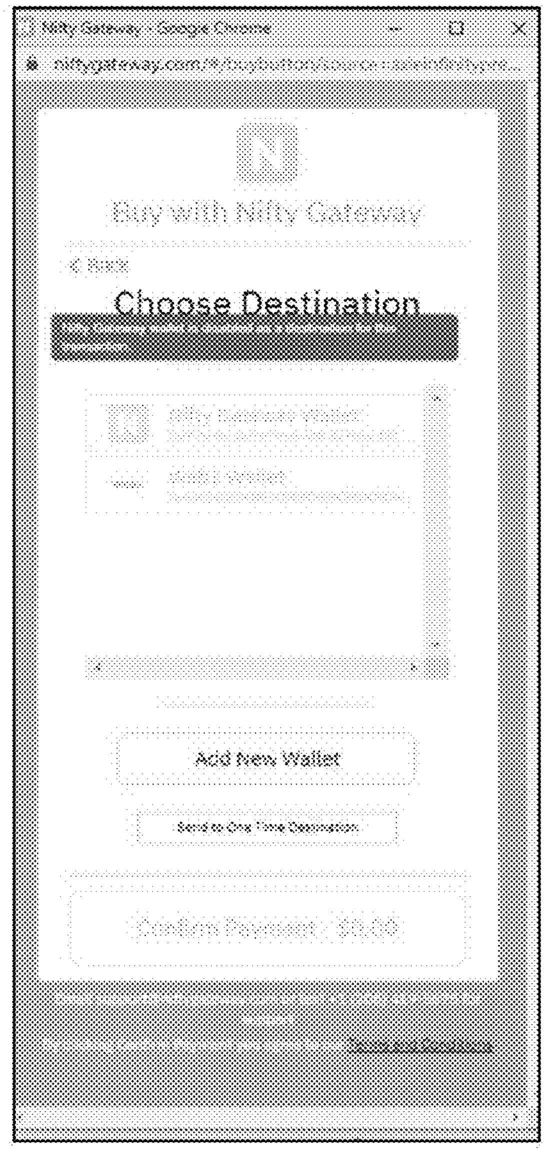
Figure 52D:
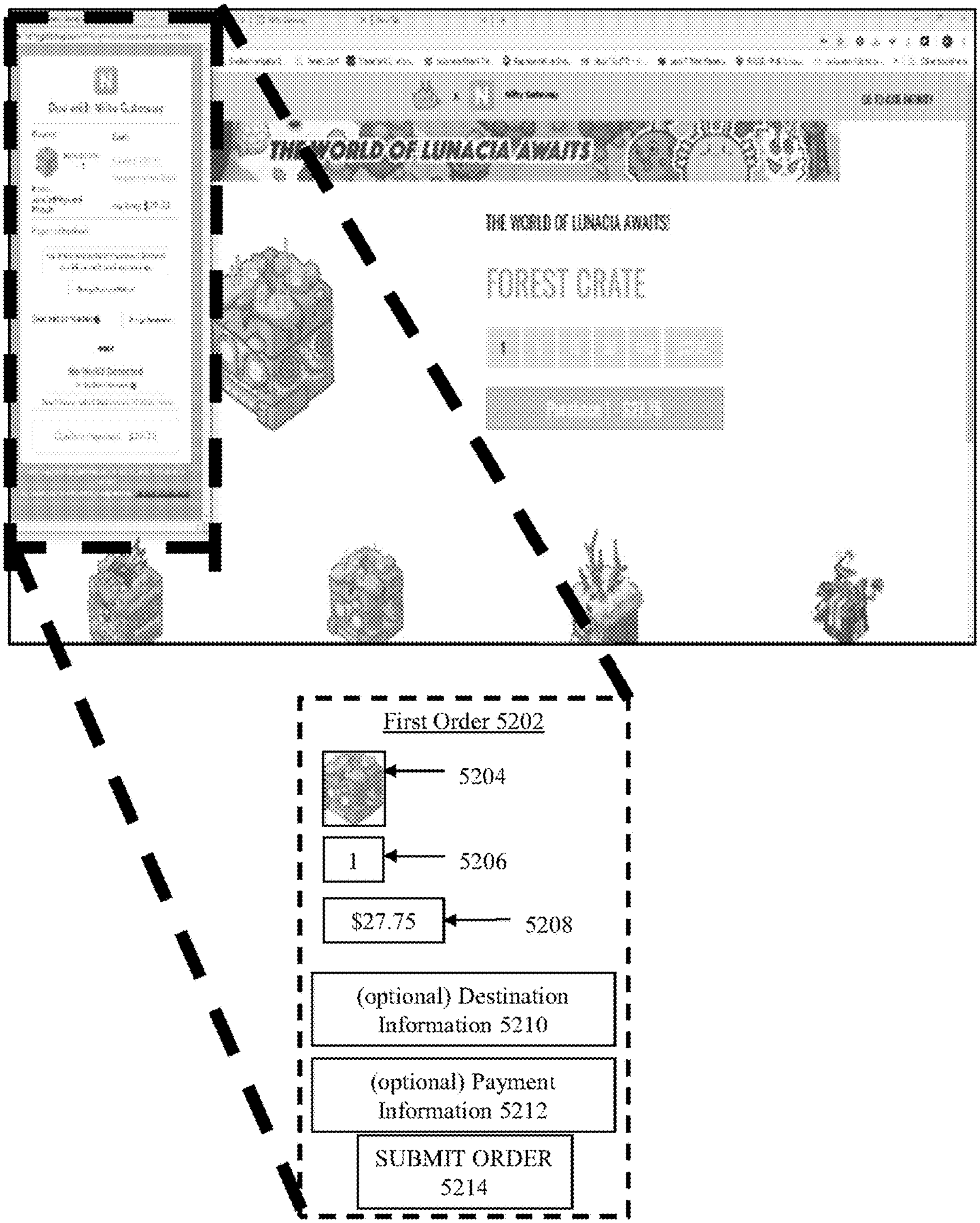

In embodiments, the first user may wish to purchase a first non-fungible token for a first retail price, as shown in connection with FIG. 52D. To purchase the first non-fungible token, the first user, via the first user device, may send a first order to the digital asset exchange system to purchase the first non-fungible token. The order, in embodiments, may include an identifier associated with the first non-fungible token, the amount of the first non-fungible token (in this example, one) and/or the retail price associated with the first non-fungible token. In embodiments, the retail price may be determined or calculated based on the amount of the non-fungible token that the user desires to purchase. For example, referring to FIG. 52D, the first order 5202, may include non-fungible token information 5204 (shown as a selected Forest Crate Non-Fungible Token), the amount of non-fungible token 5206 (shown as one), the retail price 5208 thereof (shown as $27.75), (optionally) destination information 5210, and/or (optionally) payment information 5212, to name a few. Once the first user device, in embodiments, inputs one or more of: the non-fungible token information 5204 (shown as a selected Non-Fungible Token), the amount of non-fungible token 5206 (shown as one), the retail price 5208 thereof (shown as $27.75), (optionally) destination information 5210, and/or (optionally) payment information 5212, the first user may select the submit order 5214 option, causing the first order 5202 to be sent from the first user device to the non-fungible token platform. The retail price 5208, as shown in FIG. 52D, may be a "per unit" price or a "total" price. In embodiments, as shown in FIG. 52D, the amount of non-fungible token 5206 may be 1 Forest Crate, 5 Forest Crates, 10 Forest Crates, 20 Forest Crates, and/or 100 Forest Crates, to name a few.

The first user, in embodiments, may also enter payment information, as shown in FIG. 52B. For example, the first user may enter and send, using the first user device, a credit card number and billing information associated with the first user. In embodiments, using the order and payment information, the digital asset exchange system may obtain the first non-fungible token and deliver the first non-fungible token to a public address generated by or otherwise provided by, the digital asset exchange system for the first user. A more detailed explanation of an exemplary version of this process is provided below in connection with the description of FIGS. 50A-50C, the description of which applying herein.

Figure 50A:
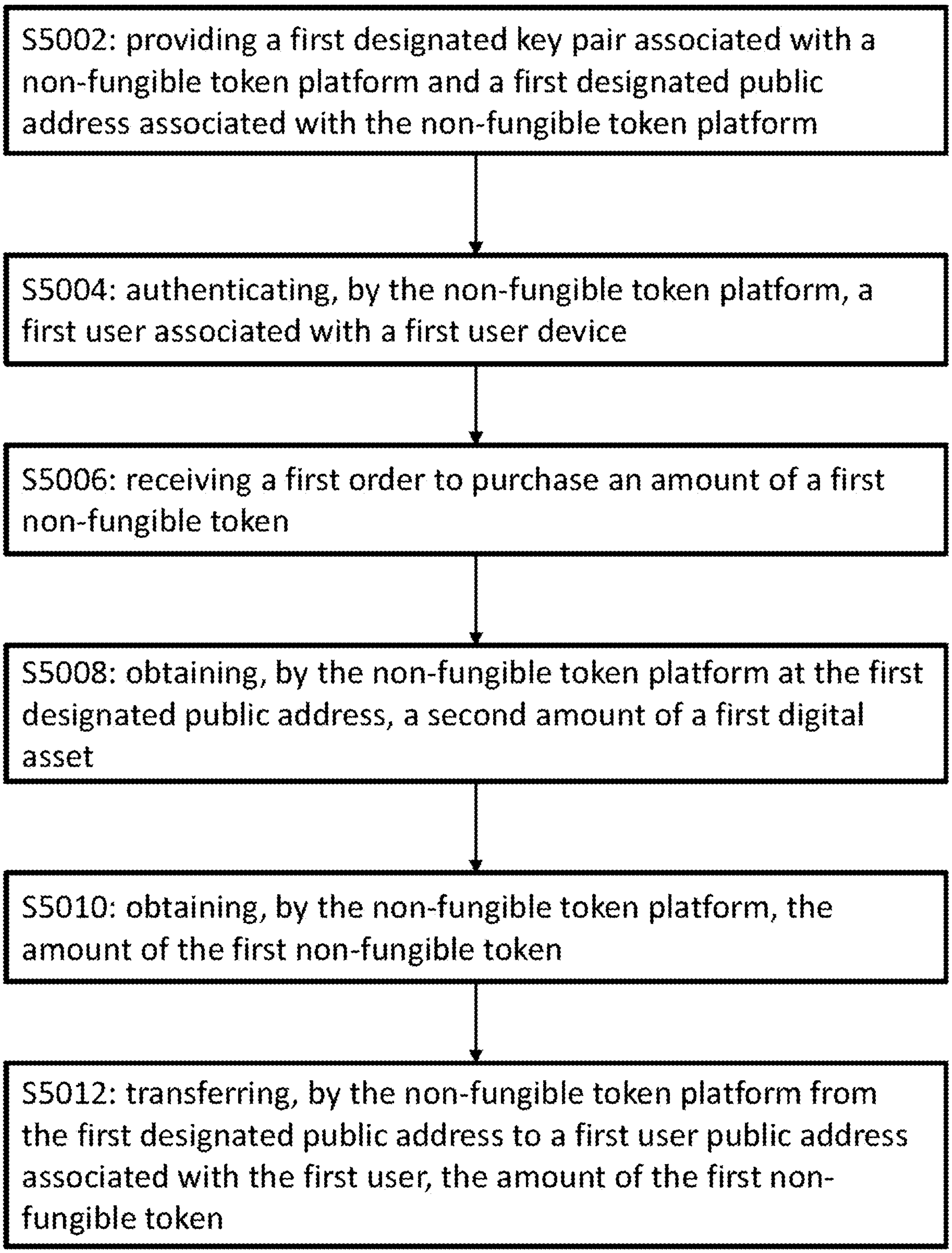
FIG. 50A is a flow chart of a process for purchasing a non-fungible token in accordance with exemplary embodiments of the present invention.

FIG. 50A is a flow chart of an exemplary process for purchasing a non-fungible token in accordance with exemplary embodiments of the present invention. Referring to FIG. 50A, in embodiments, the process for purchasing a non-fungible token may begin with step S5002. At step S5002, in embodiments, a first designated key pair associated with a non-fungible token platform and a first designated public address associated with the non-fungible token platform may be provided. In embodiments, the first designated key pair may include, a first designated public key and a corresponding first designated private key. The first designated public key may be mathematically related to the first designated private key. The first designated public key, in embodiments, may be associated with a first designated public address (e.g., the first designated public address 5102 shown in connection with FIG. 51), which, in embodiments, may be associated with an underlying digital asset. In embodiments, the underlying digital asset (e.g., NEO, ETHER, to name a few) may be maintained on a distributed public transaction ledger maintained in the form of a blockchain (e.g., the blockchain 6803). In embodiments, a first computer system associated with the non-fungible token platform may store the first designated private key, which may be similar to the on-line keyset 1 1362. In embodiments, the first computer system may have access to, or be connected with, the distributed public transaction ledger through a network, such as the internet (e.g., network 15). In embodiments, the first designated private key may be mathematically related to the first designated public key. In embodiments, the first designated public address may be the first designated public key. In embodiments, the first designated public address may be derived from the first designated public key.

In embodiments, the first designated key pair may include a plurality of key pairs (e.g., on-line keyset N 1362N). For example, the first designated key pair may further include a first additional designated public key and a corresponding first additional designated private key. In embodiments, each key pair of the aforementioned plurality of key pairs of the first designated key pair may each correspond to a designated public address. For example, a first key pair of the plurality of key pairs may correspond to a first designated public address associated with the underlying digital asset. Continuing the example, an additional key pair of the plurality of key pairs may correspond to an additional designated public address associated with the underlying digital asset. In embodiments, each key pair of the aforementioned plurality of key pairs may correspond to the same designated public address. For example, the first and additional key pairs mentioned in the examples above may be associated with the same designated public address.

In embodiments, the first designated public address may be derived by using and/or applying a cryptographic hash function of the first designated public key. In embodiments, the first designated public address is a result of the cryptographic hash function, or, in embodiments, at least a part of the result of the cryptographic hash function. A cryptographic hash function may be a hash function that is a mathematical algorithm which maps data of arbitrary size to a bit string of a fixed size (e.g., a hash). In embodiments, the cryptographic hash function may be designed to be a one-way function (e.g., a function that is infeasible to invert). The cryptographic hash function, may include one or more of the following properties: (1) deterministic such that the same message produces results in the same hash; (2) high speed, such that the hash value for a message is computed in a manner that does not slow the process down; (3) infeasible to generate a message from the hash, such that generating a message from the hash value would require attempting all possibilities (e.g., a brute force approach); and (4) unique, such that messages to not have the same hash value and/or small changes to a message alter the hash value such that the values do not correlate, to name a few. In embodiments, and as used herein, algorithm, hash algorithm, hash function, and/or cryptographic hash function may refer to one or more of the following: (1) a mathematical algorithm; (2) a one-way hash function; (3) a cryptographic hash function; (4) a one-way function; (5) a trapdoor one-way function; (6) a Data Encryption Standard encryption algorithm; (7) a Blowfish encryption algorithm; (8) An Advanced Encryption Standard or Rijndael encryption algorithm; (9) a Twofish encryption algorithm; (10) an IDEA encryption algorithm; (11) an MD5 encryption algorithm; (12) an MD4 encryption algorithm; (13) a SHA 1 hashing algorithm; (14) an HMAC hashing algorithm; and/or (15) an RSA Security algorithm, to name a few.

In embodiments, the non-fungible token platform may be associated with or included in a digital asset exchange computer system associated with a digital asset exchange. In embodiments, the non-fungible token platform may be licensed by a government regulatory authority. In embodiments, the non-fungible token platform may be similar to the administrator system 6801 described above in connection with FIG. 24, the description of which applying herein.

In embodiments, the process for purchasing a non-fungible token may continue with step S5004. At step S5004, in embodiments, the non-fungible token platform may authenticate a first user associated with a first user device. The non-fungible token platform, in embodiments, may authenticate an access request received from the first user device. For example, the non-fungible token platform may receive, from the first user device, a user login request. The user login request, in embodiments, may include user login credentials associated with the first user. User login credentials, in embodiments, may include one or more of the following: a username and password combination, biometric data associated with the first user (e.g., finger print, facial recognition identification, retinal scan, palm print, to name a few); personally identifiable information ("PII") associated with the first user; a phone number associated with the first user (e.g., a mobile phone associated with the user device); a social security number associated with the first user; an e-mail address associated with the first user; and/or a unique identifier associated with the first user, to name a few.

Continuing the example, in embodiments, the non-fungible token platform, may verify the user login credential by obtaining verified user login credentials associated with the first user and comparing said verified login credentials with the received login credentials.

In embodiments, the first user device may be similar to the first user device, described above with respect to FIGS. 48A-48D, the descriptions of which respectively applying herein. The process for authenticating an access request by the first user device may be similar to the process described above in connection with FIG. 48B, the description of which applying herein. In embodiments, the non-fungible token platform may determine whether the first user is a registered user of the digital asset exchange. In embodiments, the process for determining whether the first user is a registered user may be similar to the process for determining whether the first user is a registered user, discussed above with respect to FIGS. 48A-48D, the description of which applying herein.

In embodiments, the process for purchasing a non-fungible token may continue with step S5006. At step S5006, in embodiments, the non-fungible platform may receive a first order to purchase a first amount of a first non-fungible token. The order, in embodiments, may be received by the non-fungible platform from the first user device. A more detailed description of receiving the first order is described in connection with FIG. 50B which illustrates an exemplary flow chart of a process for receiving an order to purchase an amount of non-fungible token in accordance with exemplary embodiments of the present invention.

Figure 50B:
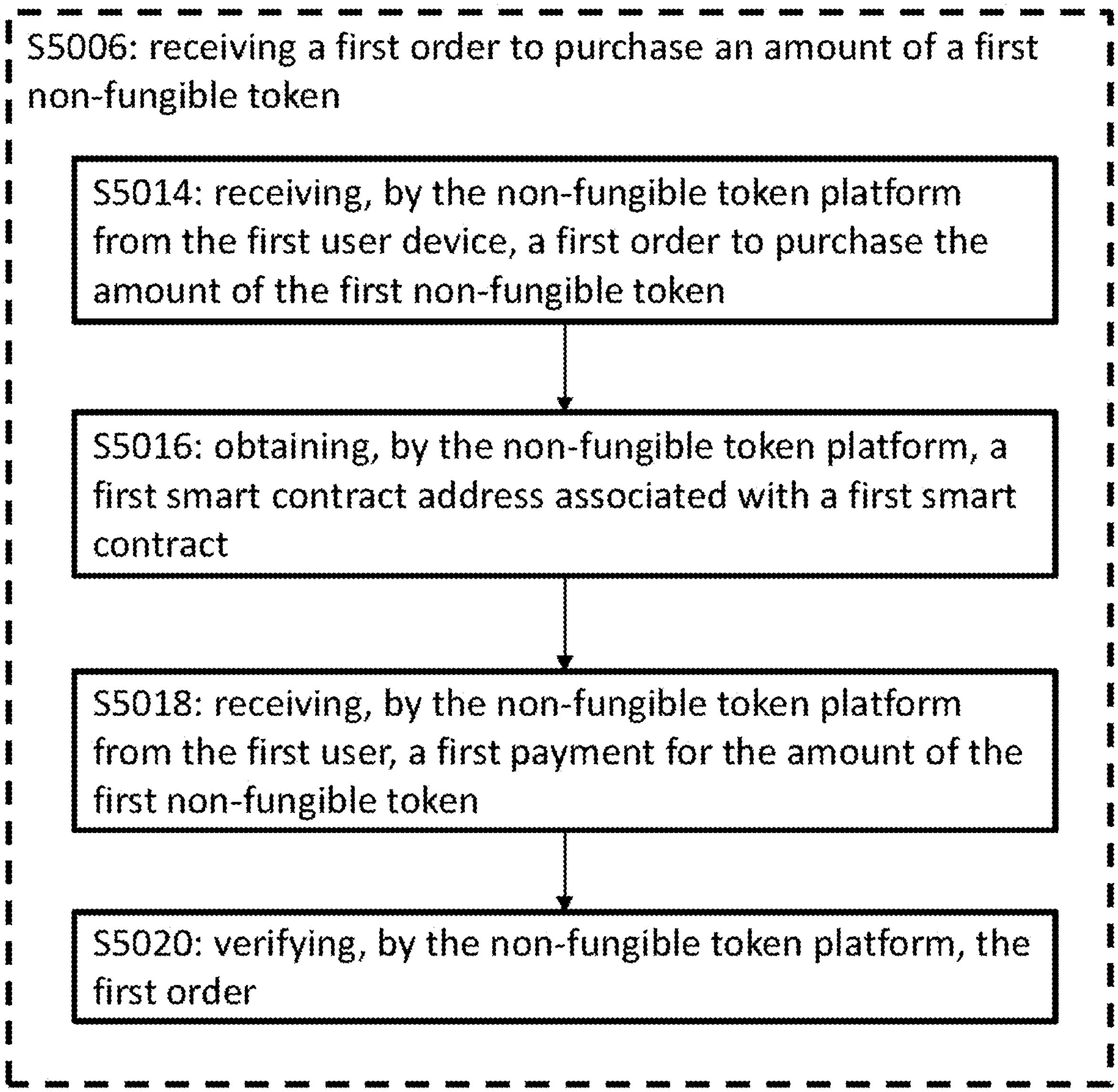
FIG. 50B is an exemplary flow chart of a process for receiving an order to purchase an amount of non-fungible token in accordance with exemplary embodiments of the present invention.

Referring to FIG. 50B, in embodiments, the process for receiving the first order may begin with step S5014. At step S5014, in embodiments, the non-fungible token platform may receive the first order to purchase the first amount of the first non-fungible token. The first order, in embodiments, may include one or more of the following: an identifier associated with the first non-fungible token; a type of non-fungible token associated with the first non-fungible token; an amount of non-fungible token; a first retail price associated with the first non-fungible token (e.g., a retail price associated with the total amount and/or a retail price associated with the unit price per non-fungible token); user destination information (e.g., a public address on the blockchain 6803 associated with or designated by the first user—illustrated in connection with FIG. 52C); and/or payment information, to name a few. The first order, and the contents thereof, may be stored by the non-fungible token platform in memory operatively connected to the non-fungible token platform. For example, the user payment information may be stored in a user payment database operatively connected to the non-fungible token platform.

In embodiments, the process for receiving the first order may continue with step S5016. At step S5016, in embodiments, the non-fungible token platform may obtain a first smart contract address associated with a first smart contract associated with the non-fungible token. In embodiments, non-fungible tokens are generated by smart contracts, each of which may generate one or more types of non-fungible tokens. The non-fungible token platform, in embodiments, may be operatively connected to a database that stores types of non-fungible tokens and their corresponding smart contract address. For example, the first non-fungible token may be generated by the first smart contract 5106. In embodiments, referring to FIG. 51, the first smart contract 5106 may include first smart contract instructions 5110 that are saved as part of the blockchain 6803.

Figure 51:
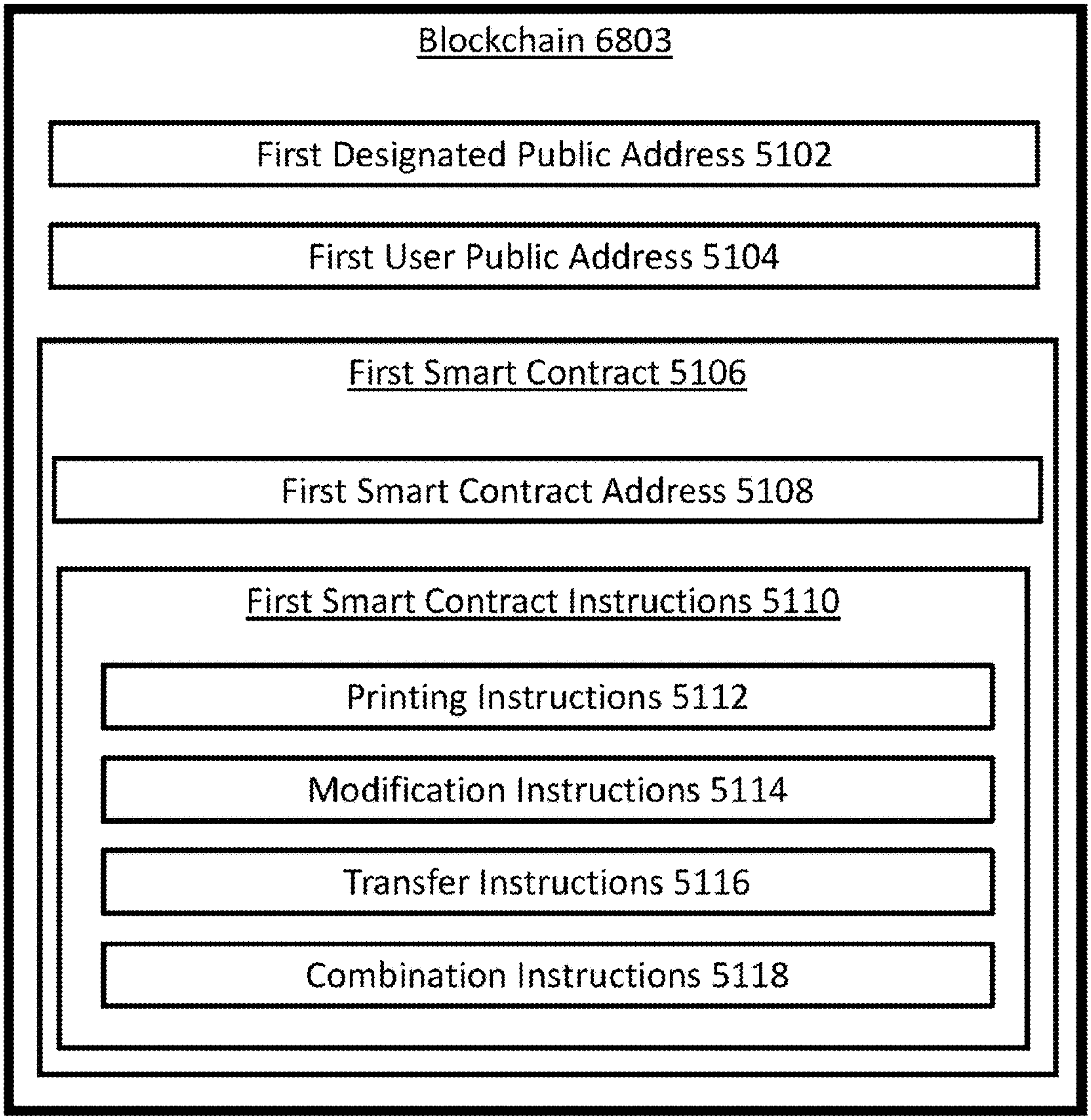
FIG. 51 is a schematic drawing of a blockchain including contract parameters of a smart contract in accordance with exemplary embodiments of the present invention.

In embodiments, as shown in connection with FIG. 51, the first smart contract 5106 may correspond to a first smart contract address 5108 associated with blockchain 6803 and include the first smart contract instructions 5110. The first smart contract instructions 5110, may include one or more modules of instructions, such as: (1) printing instructions 5112; (2) modification instructions 5114; (3) transfer instructions 5116; and/or combination instructions 5118.

In embodiments, printing instructions 5112 may include one or more instructions that indicate conditions under which non-fungible tokens associated with the first smart contract 5106 are created. For example, the printing instructions 5112 may authorize transaction requests to generate a non-fungible token if the transaction requests include one or more of the following: an identifier associated with the non-fungible token; a type associated with the non-fungible token; payment of an amount of digital asset (e.g., the manufacturer's price); the amount of the non-fungible token; and/or a destination address associated with the entity requesting the creation of a non-fungible token, to name a few. In embodiments, the printing instructions 5112 may only authorize requests to generate a non-fungible token if the transaction request comes from one or more verified digital asset exchanges (e.g., NIFTY GATEWAY and/or Gemini, to name a few). In embodiments, the printing instructions 5112 may require the transaction requests to be digitally signed by one or more digital signatures based on one or more private keys (e.g., private key associated with the first designated public address 5102 and/or private key associated with the first user public address 5104, to name a few).

In embodiments, the printing instructions 5112 may include instructions limiting the production of the non-fungible token associated with the first smart contract 5106. For example, the printing instructions 5112 may include instructions that limit the production of the non-fungible token to 1,000 tokens. In embodiments, the instructions may also include a temporal component. For example, the printing instructions 5112 may include instructions that only allow 50 non-fungible tokens to be created within a 24-hour period. Or, as another example, the printing instructions 5112 may include instructions that only allow non-fungible tokens to be created during business hours. In embodiments, the PRINT LIMITER may also include authorization instructions related to the first designated public address 5102.

The modification instructions 5114, in embodiments, may include one or more instructions that indicate conditions under which non-fungible tokens associated with the first smart contract 5106 are modified. Modification of a non-fungible digital asset, for example, may refer to adding a token (e.g., a hat) and/or subtracting a token from a non-fungible digital asset. For example, as mentioned above, a first token, e.g., a Cryptokitten Tiger, may purchase a second token, e.g., a digital "hat," that will then become associated with the first token to be a Tiger with a hat, and remain with the first token when transferred. As another example, the second token, e.g., the digital "hat", may also be subtracted from the Crytpokitten Tiger.

In embodiments, the modification instructions 5114 may authorize transaction requests to modify a non-fungible token if the transaction requests include one or more of the following: an identifier associated with the first non-fungible token; a type associated with the first non-fungible token; an identifier associated with a second non-fungible token; a type associated with a second non-fungible token; payment of an amount of digital asset (e.g., the manufacturer's price); and/or a destination address associated with the entity requesting the creation of a non-fungible token, to name a few. In embodiments, the modification instructions 5114 may only authorize requests to modify a non-fungible token if the transaction request comes from one or more verified digital asset exchanges (e.g., NIFTY GATEWAY and/or Gemini, to name a few). In embodiments, the modification instructions 5114 may require the transaction requests to be digitally signed by one or more digital signatures based on one or more private keys (e.g., private key associated with the first designated public address 5102 and/or private key associated with the first user public address 5104, to name a few).

The transfer instructions 5116, in embodiments, may include one or more instructions that indicate conditions under which non-fungible tokens associated with the first smart contract 5106 are transferred. In embodiments, the transfer instructions 5116, may include one or more instructions that indicate conditions under which digital assets are transferred from the first smart contract 5106 are transferred. In embodiments, the transfer instructions 5116 may authorize transaction requests to transfer a non-fungible token and/or a digital asset if the transaction requests include one or more of the following: an identifier associated with the first non-fungible token; a type associated with the first non-fungible token; an identifier associated with a second non-fungible token; a type associated with a second non-fungible token; payment of an amount of digital asset (e.g., the cost of the transfer); and/or a destination address associated with the entity party to the transfer, to name a few. In embodiments, the transfer instructions 5116 may only authorize requests to transfer a non-fungible token and/or digital asset if the transaction request comes from one or more verified digital asset exchanges (e.g., NIFTY GATEWAY and/or Gemini, to name a few). In embodiments, the transfer instructions 5116 may require the transaction requests to be digitally signed by one or more digital signatures based on one or more private keys (e.g., a private key associated with the first designated public address 5102 and/or private key associated with the first user public address 5104, to name a few).

The combination instructions 5118, in embodiments, may include one or more instructions that indicate conditions under which two or more non-fungible tokens associated with the first smart contract 5106 are combined to generate a new non-fungible token. Combination of two or more non-fungible digital assets, for example, may refer to "breeding" of non-fungible tokens. For example, a first Cryptokitten (a Cryptokitten Tiger) and a second Cryptokitten (a Black Cryptokitten) may be combined (e.g., "bred") to generate a third Cryptokitten (a Black Cryptokitten Tiger). The third Cryptokitten may be based on one or more features of the first Cryptokitten and the second Cryptokitten. In embodiments, the combination instructions 5118 may authorize transaction requests to combine two or more non-fungible tokens if the transaction requests include one or more of the following: an identifier associated with the first non-fungible token; a type associated with the first non-fungible token; an identifier associated with the second non-fungible token; a type associated with a second non-fungible token; payment of an amount of digital asset (e.g., the manufacturer's price to combine the first and second non-fungible token); and/or a destination address associated with the entity requesting the combination of the two or more non-fungible tokens, to name a few. In embodiments, the combination instructions 5118 may limit the amount of non-fungible tokens that can be combined. For example, the combination instructions 5118 may only combine up to six non-fungible tokens. In embodiments, the combination instructions 5118 may include instructions to create "twins", "triplets" . . . etc. In embodiments, the combination instructions 5118 may only authorize requests to modify a non-fungible token if the transaction request comes from one or more verified digital asset platforms or exchanges (e.g., NIFTY GATEWAY and/or Gemini, to name a few). In embodiments, the combination instructions 5118 may require the transaction requests to be digitally signed by one or more digital signatures based on one or more private keys (e.g., private key associated with the first designated public address 5102 and/or private key associated with the first user public address 5104, to name a few).

The process of receiving the first order, in embodiments, may continue with step S5018. At step S5018, in embodiments, the non-fungible token platform may receive a first payment for the first amount of the first non-fungible token. For example, the non-fungible token platform may run the credit card information included in the first order. However, in embodiments, the first order may not include payment information. To retrieve the payment information associated with the first user, in embodiments, the non-fungible token platform may generate and send, to the first user device, first machine-readable instructions that include a first graphical user interface. The first graphical user interface in embodiments, may include a first prompt that requests payment information from the user. Once received by the first user device, in embodiments, the first user device may execute the first machine-readable instructions, causing the first graphical user interface to be displayed by the first user device. An example of the first graphical user interface, in embodiments, is shown in connection with FIG. 52B. In response, the first user device may send payment information (e.g., bank account number, automated clearing house payment information, a credit card, and/or a public address associated with the first user and the blockchain 6803, to name a few) to the non-fungible token platform. The non-fungible token platform, in embodiments, may save the payment information in memory operatively connected to the non-fungible token platform.

Referring to FIG. 50B, the process of receiving the first order, in embodiments, may continue with step S5020. At step S5020, in embodiments, the non-fungible token platform may verify the first order. Verification of the first order may include verifying one or more of the following: the first user's payment method and whether there are sufficient funds to cover the retail price; whether the first amount of the first non-fungible token is available for purchase; whether the first non-fungible token is available for purchase; and whether the provided user destination information is associated with a public address that can receive the first amount of the first non-fungible token, to name a few.

In embodiments, the first order may not include user destination information and/or may include unverifiable user destination information. In embodiments, the non-fungible token platform may create a destination address (e.g., the first user public address 5104) for the first user, which may enable the user to receive the first amount of the first non-fungible token. For example, the non-fungible token platform may generate a transaction request including a request to generate a public address. The transaction request, in embodiments, may be digitally signed by the non-fungible token platform based on a private key associated with the non-fungible token platform (e.g., the first designated private key). The generated transaction request, in embodiments, may be published by the non-fungible token platform via the blockchain 6803 to the plurality of geographically distributed computer systems associated with the blockchain 6803. Once published, the transaction request, in embodiments, may be executed by the plurality of geographically distributed computer systems, resulting in the first user public address 5102 being returned to the first designated public address 5102. In embodiments, the execution of the transaction request may also result in a second key pair being returned to the first designated public address 5102. The second key pair, which may be associated with the first user public address 5104, in embodiments, may include a second public key and a corresponding and/or mathematically related second private key. The first public address 5102 and the second key pair may be saved on memory operatively connected to the non-fungible token platform. In embodiments, the non-fungible token platform may send a message including the first public address 5102 and the second key pair to the first user device.

Referring to FIG. 50A, in embodiments, the process for purchasing a non-fungible token may continue with step S5008. At step S5008, in embodiments, the non-fungible platform may obtain a second amount of a first digital asset at the first designated public address 5102. The second amount, in embodiments, may be the cost to generate the first amount of the first non-fungible token. The first digital asset, in embodiments, may be one or more of the following: BITCOIN, NAMECOINS, LITECOINS, PPCOINS, TONAL BITCOINS, BITCOIN CASH, ZCASH, IXCOINS, DEVCOINS, FREICOINS, I0COINS, TERRACOINS, LIQUIDCOINS, BBQCOINS, BITBARS, PHENIXCOINS, RIPPLE, DOGECOINS, BARNBRIDGE, POLYGON, SOMNIUM SPACE, OCEAN PROTOCOL, SUSHISWAP, INJECTIVE, LIVEPEER, MASTERCOINS, BLACKCOINS, ETHER, NXT, BITSHARES-PTS, QUARK, PRIMECOIN, FEATHERCOIN, PEERCOIN, FACEBOOK GLOBAL COIN, STELLAR, TOP 100 TOKENS, TETHER, MAKER; CRYPTO.COM CHAIN; BASIC ATTENTION TOKEN; USD COIN; CHAINLINK; BITTORRENT; OMISEGO; HOLO; TRUEUSD; PUNDI X; ZILLIQA; ATOM, AUGUR; 0X; AURORA; PAXOS STANDARD TOKEN; HUOBI TOKEN, IOST; DENT; QUBITICA; ENJIN COIN; MAXIMINE COIN; THORECOIN; MAIDSAFECOIN; KUCOIN SHARES; CRYPTO.COM; SOLVE; STATUS; MIXIN; WALTONCHAIN; GOLEM; INSIGHT CHAIN; DAI; VESTCHAIN; AELF; WAX; DIGIXDAO, LOOM NETWORK; NASH EXCHANGE; LATOKEN; HEDGETRADE; LOOPRING; REVAIN; DECENTRALAND; ORBS; NEXT; SANTIMENT NETWORK TOKEN; POPULOUS; NEXO; CELER NETWORK; POWER LEDGER; ODEM; KYBER NETWORK; QASH; BANCOR; CLIPPER COIN; MATIC NETWORK; POLYMATH; FUNFAIR; BREAD, IOTEX, ECOREAL ESTATE; REPO; UTRUST; ARCBLOCK; BUGGYRA COIN ZERO; LAMBDA; IEXEC RLC; STASIS EURS; ENIGMA; QUARKCHAIN; STORJ; UGAS; RIF TOKEN; JAPAN CONTENT TOKEN; FANTOM; EDUCARE; FUSION; GAS; MAINFRAME, BIBOX TOKEN; CRYPTO20; EGRETIA; REN; SYNTHETIX NETWORK TOKEN; VERITASEUM; CORTEX; CINDICATOR; CIVIC; RCHAIN; TENX; KIN, DAPS TOKEN; SINGULARITYNET; QUANT; GNOSIS; INO COIN; ICONOMI; MEDIBLOC [ERC20]; 0X; AION; ALGORAND; AMP; ARCA; ARWEAVE; AUDIUS; AVALANCHE; BCB; BCC; BITCOIN SV, BLOCKSTACKS; CBAT; CDAI, CELA; CELO; CETH; CHIA; CODA; COSMOS; CWBTC; CZRK; DECRED; DFINITY; EOS; ETH 2.0; FILECOIN, HEDGETRADE; ION, KADENA; KYBER NETWORK, MOBILECION, NEAR; NERVOS; OASIS, OMISEGO; PAXG, POLKADOT, SKALE; DIEM; SOLANA; STELLAR; TEZOS; THETA; XRP; DIEM and/or DEW, to name a few.

The non-fungible token platform, may, for example, obtain the second amount of the first digital asset by generating and publishing to the peer-to-peer network a transaction request to obtain the second amount of the first digital asset from a public address that is able to transfer the second amount of the first digital asset to the first designated public address. In embodiments, the transaction request may include a transfer of a third amount of a second digital asset in exchange for a transfer of the second amount of the first digital asset. The transaction request, in embodiments, may be digitally signed based on a private key associated with the non-fungible token platform. The generated transaction request, in embodiments, may be published by the non-fungible token platform via the blockchain 6803 to the plurality of geographically distributed computer systems associated with the blockchain 6803. Once published to the peer-to-peer network, the transaction request, in embodiments, may be executed by the plurality of geographically distributed computer systems in the peer-to-peer network, resulting in the third amount of the second digital asset being sent to the public address from the first designated public address 5102 and the second amount of the first digital asset being sent to the first designated public address 5102 from the public address.

Figure 50C:
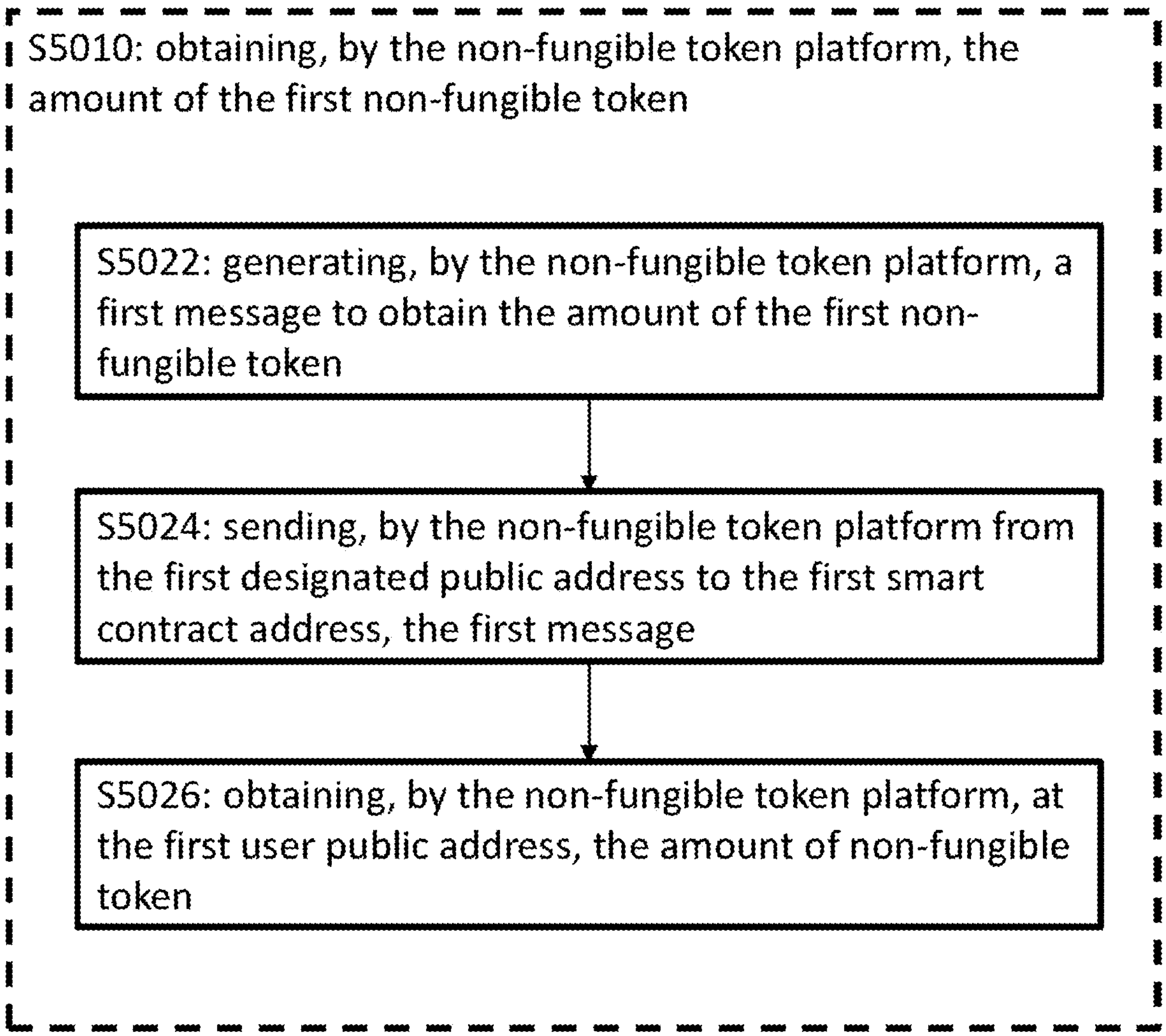
FIG. 50C is an exemplary flow chart of a process for receiving an amount of non-fungible token in accordance with exemplary embodiments of the present invention.

In embodiments, the process for purchasing a non-fungible token may continue with step S5010. At step S5010, in embodiments, the non-fungible platform may obtain the first amount of the first non-fungible token. A more detailed explanation of obtaining the first amount of the first non-fungible token is located in connection with the description of FIG. 50C. FIG. 50C is an exemplary flow chart of a process for obtaining the first amount of the first non-fungible token in accordance with exemplary embodiments of the present invention.

The process for receiving the first amount of the first non-fungible token, in embodiments, may begin with step S5022. At step S5022, in embodiments, the non-fungible token platform generates a first message to obtain the first amount of the first non-fungible token. In embodiments, the first message may include transfer instructions including a first transfer of the second amount of the first digital asset from the first designated public address 5102 to the first smart contract address 5108. In embodiments, the first message may include generation instructions to generate the first amount of the first non-fungible token. The generation instructions may include a destination address for the generated first amount of the first non-fungible token. For example, the destination address may be the first designated public address 5102. In embodiments, the destination address may be the first user public address 5104.

The process for receiving the first amount of the first non-fungible token, in embodiments, may continue with step S5024. At step S5024, in embodiments, the non-fungible token platform may send the first message from the first designated public address 5102 to the first smart contract address 5108 via the blockchain 6803. In embodiments, the non-fungible token platform may publish the first message to the blockchain 6803, resulting in the execution of the instructions within the first message. Once received, the first message may be executed by the first smart contract 5106 may execute the instructions within the first message in accordance with the first smart contract instructions 5110.

The process for receiving the first amount of the first non-fungible token, in embodiments, may continue with step S5026. At step S5026, in embodiments, the non-fungible token platform may receive the first amount of the first non-fungible token at the fist designated public address 5102. Alternatively, in embodiments, the first user public address 5104 may receive the first amount of the first non-fungible token.

Referring to FIG. 50A, in embodiments, the process for purchasing a non-fungible token may continue with step S5012. At step S5012, in embodiments, the non-fungible platform may transfer, from the first designated public address 5102 to the first user public address 5104, the first amount of the first non-fungible token.

In embodiments, the steps of the process described in connection with FIGS. 50A-50C may be rearranged or omitted.

In embodiments, a method comprises: (a) providing, by a non-fungible token platform, a first designated key pair comprising a first designated public key and a corresponding first designated private key, wherein the non-fungible token platform comprises one or more computer systems operatively connected to a memory device, wherein the first designated private key is stored on the memory device, wherein the non-fungible token platform is associated with a first designated key pair comprising the first designated public key and the first designated private key, wherein the first designated public key corresponds to a first designated public address associated with an underlying digital asset, and wherein the underlying digital asset is maintained on a distributed public transaction ledger maintained in the form of a blockchain by a plurality of geographically distributed computer systems in a peer-to-peer network in the form of a blockchain; (b) authenticating, by the non-fungible token platform, a first user associated with a first user device by performing the following steps: (i) receiving, by the non-fungible token platform from the first user device, a user login request comprising user login credential information associated with a first user associated with the first user device; (ii) obtaining, by the non-fungible token platform, verified credential information associated with the first user; and (iii) verifying, by the non-fungible token platform, that the user login credential information is associated with a registered user account based at least on the received user login credential information and the verified credential information associated with the first user; (c) receiving a first order to purchase an amount of a first non-fungible token, wherein receiving the first order comprises the following: (i) receiving, by the non-fungible token platform from the first user device, the first order, wherein the first order comprises: (1) an identifier associated with the first non-fungible token, the identifier indicating a first type of non-fungible token; (2) the amount of the first non-fungible token; (3) a first retail price of the first non-fungible token; and (4) user destination information associated with the first user, wherein the user destination information comprises a first user public address associated with the underlying digital asset, wherein the first user public address is associated with the first user, and wherein the user destination information is stored on the memory operatively connected to the non-fungible token platform; (ii) obtaining, by the non-fungible token platform, a first smart contract address associated with a first smart contract, wherein the first smart contract is associated with first smart contract instructions that are saved as part of the blockchain and includes: (1) printing instructions indicating conditions under which the first non-fungible token is created; (2) modification instructions indicating conditions under which the first non-fungible token is modified; and (3) transfer instructions indicating conditions under which the non-fungible token is transferred; (iii) receiving, by the non-fungible token platform, a first payment of the first retail price from the first user; and (iv) verifying, by the non-fungible token platform, the first order by verifying: (1) the identifier associated with the first non-fungible token; (2) the type of non-fungible token (3) the amount of the first non-fungible token; (4) the first retail price of the first non-fungible token; and (5) the user destination information associated with the first user; (d)

obtaining, by the non-fungible token platform at the first designated public address, at least a second amount of the underlying digital asset, wherein the second amount of the underlying digital asset corresponds to a first manufacturers price indicating a cost of creating the amount of the first non-fungible token; (e) obtaining, by the non-fungible token platform at the first designated public address, the amount of the first non-fungible token, wherein obtaining the amount of the first non-fungible token comprises the following steps: (i) generating, by the non-fungible token platform, a first message from the first public address to the first smart contract address, comprising: (1) transfer instructions including a first transfer of the second amount of the underlying digital asset from the first designated public address to the first smart contract address; and (2) first generation instructions to generate the amount of the first non-fungible token to the first designated public address wherein the first message includes a first digital signature based at least on the first designated private key; and (ii) publishing, by the non-fungible token platform to the blockchain via the Internet, the first message, wherein, upon receipt of the first message, the first smart contract executes the transfer instructions in accordance with the first smart contract instructions and the first generating instructions in accordance with the first smart contract instructions to generate the amount of the first non-fungible token in the first designated public address; (f) transferring, by the non-fungible token platform from the first designated public address to the first user public address, the amount of the first non-fungible token, wherein transferring the amount comprises the following steps: (i) generating, by the non-fungible token platform, a second transaction request including a second transfer of the amount of non-fungible token from the first designated public address to the first user public address, wherein the second transaction request includes a second digital signature based at least on first designated private key; (ii) publishing, by the non-fungible token platform via the blockchain, the second transaction request to the plurality of geographically distributed computer systems, wherein the second transaction request is executed by the plurality of geographically distributed computer systems, and wherein the execution of the second transaction request results in the amount of non-fungible tokens being transferred from the first designated public address to the first user public address; and (iii) confirming, by the non-fungible token platform, that the amount of non-fungible tokens is present at the first user public address based on reference to the blockchain.

In embodiments, receiving the first payment comprises: (1) generating, by the non-fungible token platform, first machine-readable instructions including a first graphical user interface comprising a first prompt requesting payment information from the first user; (2) sending, by the non-fungible token platform to the first user device, the first machine-readable instructions, wherein, upon receipt of the first machine-readable instructions, the first user device executes the first machine-readable instructions causing the first user device to display the first graphical user interface; and (3) receiving, by the non-fungible token platform from the first user device, user payment information associated with the first user, wherein the user payment information is stored on the memory device, and wherein the first payment is received by the non-fungible token platform using the user payment information. In embodiments, the user payment information comprises: (A) a credit card number associated with the first user; and (B) a billing address associated with the first user. In embodiments, the user payment information comprises a bank account number associated with the first user. In embodiments, the user payment information comprises automated clearing house payment information associated with the first user. In embodiments, the user payment information comprises a second user public address associated with the first user. In embodiments, the second user public address is the first user public address.

In embodiments, receiving the first payment comprises: (1) providing a user payment database operatively connected to the non-fungible token platform, wherein the user payment database comprises: (A) user payment information associated with the first user; (2) accessing, by the non-fungible token platform, the user payment database; and (3) retrieving, by the non-fungible token platform from the user payment database, the user payment information.

In embodiments, obtaining the second amount of the underlying digital asset comprises: (i) generating, by the non-fungible token platform, a third transaction request including: (1) a third transfer of a third amount of digital asset from a public address associated with the non-fungible token platform and the underlying digital asset to a second public address associated with the underlying digital asset; and (2) a fourth transfer of the second amount of the underlying digital asset from the second public address to the public address associated with the non-fungible token platform, wherein the third transaction request includes a third digital signature based at least on first designated private key; (ii) publishing, by the non-fungible token platform via the blockchain, the third transaction request to the plurality of geographically distributed computer systems, wherein the third transaction request is executed by the plurality of geographically distributed computer systems, and wherein the execution of the third transaction request results in the third transfer being executed and the fourth transfer being executed; and (iii) receiving, by the non-fungible token platform at the public address associated with the non-fungible token platform, the second amount of the underlying digital asset. In embodiments, obtaining the second amount of the underlying digital asset further comprises: (i) generating, by the non-fungible token platform, a fourth transaction request including: (1) a fifth transfer of the third amount of digital asset from the public address associated with the non-fungible token platform to the first designated public address, wherein the fourth transaction request includes a fourth digital signature based at least on first designated private key; (ii) publishing, by the non-fungible token platform via the blockchain, the fourth transaction request to the plurality of geographically distributed computer systems, wherein the fourth transaction request is executed by the plurality of geographically distributed computer systems, and wherein the execution of the fourth transaction request results in the fifth transfer being executed; and (iii) receiving, by the non-fungible token platform at the first designated public address, the second amount of the underlying digital asset. In embodiments, the public address associated with the non-fungible token platform is the first designated public address.

In embodiments, obtaining the second amount of the underlying digital asset comprises: (i) generating, by the non-fungible token platform, a third transaction request including: (1) a third transfer of a third amount of digital asset from the first designated public address to a second public address associated with the underlying digital asset; and (2) a fourth transfer of the second amount of the underlying digital asset from the second public address to the first designated public address, wherein the third transaction request includes a third digital signature based at least on first designated private key; (ii) publishing, by the non-fungible token platform via the blockchain, the third transaction request to the plurality of geographically distributed computer systems, wherein the fourth transaction request is executed by the plurality of geographically distributed computer systems, and wherein the execution of the third transaction request results in the third transfer being executed and the fourth transfer being executed; and (iii) receiving, by the non-fungible token platform at the first designated public address, the second amount of the underlying digital asset.

In embodiments, receiving the first order further comprises: (iv) generating, by the non-fungible token platform, a third transaction request including a request to generate a public address, wherein the third transaction request includes a third digital signature based at least on first designated private key; (v) publishing, by the non-fungible token platform via the blockchain, the third transaction request to the plurality of geographically distributed computer systems, wherein the third transaction request is executed by the plurality of geographically distributed computer systems, and wherein the execution of the third transaction request results in the first user public address being returned to the first designated public address, wherein, the execution of the third transaction request results in a second key pair being returned to the first designated public address, wherein the second key pair comprises a first user public key and a corresponding first user private key, wherein the first user private key is stored on the memory device, and wherein the first user public key corresponds to the first user public address; and (vi) sending, by the non-fungible token platform to the first user device, the first user public address and the first user public key. In embodiments, receiving the first order further comprises sending the first user private key, by the non-fungible token platform, to the first user device.

In embodiments, receiving the first order further comprises: (iv) receiving, by the non-fungible token platform from the first user device, the first user public address; and (v) storing, by the non-fungible token platform using the memory device, the first user public address.

In embodiments, receiving the first order further comprises: (1) providing a user destination database operatively connected to the non-fungible token platform, wherein the user payment database comprises: (A) the first user public address; (2) accessing, by the non-fungible token platform, the user destination database; and (3) retrieving, by the non-fungible token platform from the user destination database, the first user public address.

In embodiments, the first smart contract instructions further include: (4) combination instructions indicating conditions under which two or more first non-fungible tokens are combined to generate a new first non-fungible token.

In embodiments, the first retail price is a price of one of the first non-fungible token.

In embodiments, the first retail price is a price of the amount of the first non-fungible token.

In embodiments, the user login credential information comprises: (i) a username associated with the first user; and (ii) a password associated with the first user.

In embodiments, the user login credential information comprises: (i) biometric data associated with the first user.

In embodiments, the user login credential information comprises: (i) a phone number associated with the first user.

In embodiments, the user login credential information comprises: (i) a social security number associated with the first user.

In embodiments, the user login credential information comprises: (i) an e-mail address associated with the first user.

In embodiments, the first digital signature and the second digital are the same.

In embodiments, the first digital signature and the second digital are different.

In embodiments, the first transaction request includes a fee that is transferred from a public address associated with the non-fungible token platform to at least one miner of the blockchain.

In embodiments, the second transaction request includes a fee that is transferred from a public address associated with the non-fungible token platform to at least one miner of the blockchain.

In embodiments, the first non-fungible token is a CRYPTOKITTY.

In embodiments, the first non-fungible token is an EVERDRAGON.

In embodiments, the first non-fungible token is CRYPTO BASEBALL.

In embodiments, the first non-fungible token is MYCRYPTOHEROES.

In embodiments, the first non-fungible token is a MARBLECARD.

In embodiments, a method comprises (a) providing, by a non-fungible token platform, a first designated key pair comprising a first designated public key and a corresponding first designated private key, wherein the non-fungible token platform comprises one or more computer systems operatively connected to a memory device, wherein the first designated private key is stored on the memory device, wherein the non-fungible token platform is associated with a first designated key pair comprising the first designated public key and the first designated private key, wherein the first designated public key corresponds to a first designated public address associated with an underlying digital asset, and wherein the underlying digital asset is maintained on a distributed public transaction ledger maintained in the form of a blockchain by a plurality of geographically distributed computer systems in a peer-to-peer network in the form of a blockchain; (b) authenticating, by the non-fungible token platform, a first user associated with a first user device by performing the following steps: (i) receiving, by the non-fungible token platform from the first user device, a user login request comprising user login credential information associated with a first user associated with the first user device; (ii) obtaining, by the non-fungible token platform, verified credential information associated with the first user; and (iii) verifying, by the non-fungible token platform, that the user login credential information is associated with a registered user account based at least on the received user login credential information and the verified credential information associated with the first user; (c) receiving a first order to purchase an amount of a first non-fungible token, wherein receiving the first order comprises the following: (i) receiving, by the non-fungible token platform from the first user device, the first order, wherein the first order comprises: (1) an identifier associated with the first non-fungible token, the identifier indicating a first type of non-fungible token; (2) the amount of the first non-fungible token; (3) a first retail price of the first non-fungible token; and (4) user destination information associated with the first user, wherein the user destination information comprises a first user public address associated with the underlying digital asset, wherein the first user public address is associated with the first user, and wherein the user destination information is stored on the memory operatively connected to the non-fungible token platform; (ii) obtaining, by the non-fungible token platform, a first smart contract address associated with a first smart contract, wherein the first smart contract is associated with first smart contract instructions that are saved as part of the blockchain and includes: (1) printing instructions indicating conditions under which the first non-fungible token is created; (2) modification instructions indicating conditions under which the first non-fungible token is modified; and (3) transfer instructions indicating conditions under which the non-fungible token is transferred; (iii) receiving, by the non-fungible token platform, a first payment of the first retail price from the first user; and (iv) verifying, by the non-fungible token platform, the first order by verifying: (1) the identifier associated with the first non-fungible token; (2) the type of non-fungible token (3) the amount of the first non-fungible token; (4) the first retail price of the first non-fungible token; and (5) the user destination information associated with the first user; (d) obtaining, by the non-fungible token platform at the first designated public address, at least a second amount of a first digital asset, wherein the second amount of the first digital asset corresponds to a first manufacturers price indicating a cost of creating the amount of the first non-fungible token; (e) obtaining, by the non-fungible token platform at the first designated public address, the amount of the first non-fungible token, wherein obtaining the amount of the first non-fungible token comprises the following steps: (i) generating, by the non-fungible token platform, a first message from the first public address to the first smart contract address, comprising: (1) transfer instructions including a first transfer of the second amount of the first digital asset from the first designated public address to the first smart contract address; and (2) first generation instructions to generate the amount of the first non-fungible token to the first designated public address wherein the first message includes a first digital signature based at least on the first designated private key; and (ii) publishing, by the non-fungible token platform to the blockchain via the Internet, the first message, wherein, upon receipt of the first message, the first smart contract executes the transfer instructions in accordance with the first smart contract instructions and the first generating instructions in accordance with the first smart contract instructions to generate the amount of the first non-fungible token in the first designated public address; (f) transferring, by the non-fungible token platform from the first designated public address to the first user public address, the amount of the first non-fungible token, wherein transferring the amount comprises the following steps: (i) generating, by the non-fungible token platform, a second transaction request including a second transfer of the amount of non-fungible token from the first designated public address to the first user public address, wherein the second transaction request includes a second digital signature based at least on first designated private key; (ii) publishing, by the non-fungible token platform via the blockchain, the second transaction request to the plurality of geographically distributed computer systems, wherein the second transaction request is executed by the plurality of geographically distributed computer systems, and wherein the execution of the second transaction request results in the amount of non-fungible tokens being transferred from the first designated public address to the first user public address; and (iii) confirming, by the non-fungible token platform, that the amount of non-fungible tokens is present at the first user public address based on reference to the blockchain.

In embodiments, receiving the first payment comprises: (1) generating, by the non-fungible token platform, first machine-readable instructions including a first graphical user interface comprising a first prompt requesting payment information from the first user; (2) sending, by the non-fungible token platform to the first user device, the first machine-readable instructions, wherein, upon receipt of the first machine-readable instructions, the first user device executes the first machine-readable instructions causing the first user device to display the first graphical user interface; and (3) receiving, by the non-fungible token platform from the first user device, user payment information associated with the first user, wherein the user payment information is stored on the memory device, and wherein the first payment is received by the non-fungible token platform using the user payment information. In embodiments, the user payment information comprises: (A) a credit card number associated with the first user; and (B) a billing address associated with the first user. In embodiments, the user payment information comprises a bank account number associated with the first user. In embodiments, the user payment information comprises automated clearing house payment information associated with the first user. In embodiments, the user payment information comprises a second user public address associated with the first user. In embodiments, the second user public address is the first user public address.

In embodiments, receiving the first payment comprises: (1) providing a user payment database operatively connected to the non-fungible token platform, wherein the user payment database comprises: (A) user payment information associated with the first user; (2) accessing, by the non-fungible token platform, the user payment database; and (3) retrieving, by the non-fungible token platform from the user payment database, the user payment information.

In embodiments, obtaining the second amount of the first digital asset comprises: (i) generating, by the non-fungible token platform, a third transaction request including: (1) a third transfer of a third amount of a second digital asset from a public address associated with the non-fungible token platform and the underlying digital asset to a second public address associated with the underlying digital asset; and (2) a fourth transfer of the second amount of the first digital asset from the second public address to the public address associated with the non-fungible token platform, wherein the third transaction request includes a third digital signature based at least on first designated private key; (ii) publishing, by the non-fungible token platform via the blockchain, the third transaction request to the plurality of geographically distributed computer systems, wherein the third transaction request is executed by the plurality of geographically distributed computer systems, and wherein the execution of the third transaction request results in the third transfer being executed and the fourth transfer being executed; and (iii) receiving, by the non-fungible token platform at the public address associated with the non-fungible token platform, the second amount of the first digital asset. In embodiments, obtaining the second amount of the first digital asset further comprises: (i) generating, by the non-fungible token platform, a fourth transaction request including: (1) a fifth transfer of the third amount of the second digital asset from the public address associated with the non-fungible token platform to the first designated public address, wherein the fourth transaction request includes a fourth digital signature based at least on first designated private key; (ii) publishing, by the non-fungible token platform via the blockchain, the fourth transaction request to the plurality of geographically distributed computer systems, wherein the fourth transaction request is executed by the plurality of geographically distributed computer systems, and wherein the execution of the fourth transaction request results in the fifth transfer being executed; and (iii) receiving, by the non-fungible token platform at the first designated public address, the third amount of the first digital asset. In embodiments, the public address associated with the non-fungible token platform is the first designated public address.

In embodiments, obtaining the second amount of the first digital asset comprises: (i) generating, by the non-fungible token platform, a third transaction request including: (1) a third transfer of a third amount of a second digital asset from the first designated public address to a second public address associated with the underlying digital asset; and (2) a fourth transfer of the second amount of the first digital asset from the second public address to the first designated public address, wherein the third transaction request includes a third digital signature based at least on first designated private key; (ii) publishing, by the non-fungible token platform via the blockchain, the third transaction request to the plurality of geographically distributed computer systems, wherein the fourth transaction request is executed by the plurality of geographically distributed computer systems, and wherein the execution of the third transaction request results in the third transfer being executed and the fourth transfer being executed; and (iii) receiving, by the non-fungible token platform at the first designated public address, the second amount of the first digital asset.

In embodiments, receiving the first order further comprises: (iv) generating, by the non-fungible token platform, a third transaction request including a request to generate a public address, wherein the third transaction request includes a third digital signature based at least on first designated private key; (v) publishing, by the non-fungible token platform via the blockchain, the third transaction request to the plurality of geographically distributed computer systems, wherein the third transaction request is executed by the plurality of geographically distributed computer systems, and wherein the execution of the third transaction request results in the first user public address being returned to the first designated public address, wherein, the execution of the third transaction request results in a second key pair being returned to the first designated public address, wherein the second key pair comprises a first user public key and a corresponding first user private key, wherein the first user private key is stored on the memory device, and wherein the first user public key corresponds to the first user public address; and (vi) sending, by the non-fungible token platform to the first user device, the first user public address and the first user public key. In embodiments, receiving the first order further comprises sending the first user private key, by the non-fungible token platform, to the first user device.

In embodiments, receiving the first order further comprises: (iv) receiving, by the non-fungible token platform from the first user device, the first user public address; and (v) storing, by the non-fungible token platform using the memory device, the first user public address.

In embodiments, receiving the first order further comprises: (1) providing a user destination database operatively connected to the non-fungible token platform, wherein the user payment database comprises: (A) the first user public address; (2) accessing, by the non-fungible token platform, the user destination database; and (3) retrieving, by the non-fungible token platform from the user destination database, the first user public address.

In embodiments, the first smart contract instructions further include: (4) combination instructions indicating conditions under which two or more first non-fungible tokens are combined to generate a new first non-fungible token.

In embodiments, the first retail price is a price of one of the first non-fungible token.

In embodiments, the first retail price is a price of the amount of the first non-fungible token.

In embodiments, the user login credential information comprises: (i) a username associated with the first user; and (ii) a password associated with the first user.

In embodiments, the user login credential information comprises: (i) biometric data associated with the first user.

In embodiments, the user login credential information comprises: (i) a phone number associated with the first user.

In embodiments, the user login credential information comprises: (i) a social security number associated with the first user.

In embodiments, the user login credential information comprises: (i) an e-mail address associated with the first user.

In embodiments, the first digital signature and the second digital are the same.

In embodiments, the first digital signature and the second digital are different.

In embodiments, the first transaction request includes a fee that is transferred from a public address associated with the non-fungible token platform to at least one miner of the blockchain.

In embodiments, the second transaction request includes a fee that is transferred from a public address associated with the non-fungible token platform to at least one miner of the blockchain.

In embodiments, the first non-fungible token is a CRYPTOKITTY.

In embodiments, the first non-fungible token is an EVERDRAGON.

In embodiments, the first non-fungible token is CRYPTO BASEBALL.

In embodiments, the first non-fungible token is MYCRYPTOHEROES.

In embodiments, the first non-fungible token is a MARBLECARD.

In embodiments, the first digital asset is BITCOIN.

In embodiments, the first digital asset is ETHER.

In embodiments, the first digital asset is LITECOIN.

In embodiments, the first digital asset is BITCOIN CASH.

In embodiments, the first digital asset is ZCASH.

In embodiments, the first digital asset is a digital asset token. In embodiments, the digital asset token is GEMINI DOLLAR.

In embodiments, a method of increasing a total supply of digital asset tokens comprises the steps of: (a) providing a first designated key pair, comprising a first designated public key and a corresponding first designated private key, wherein the first designated public key also corresponds to a first designated public address associated with an underlying digital asset; wherein the underlying digital asset is maintained on a distributed public transaction ledger maintained in the form of a blockchain by a plurality of geographically distributed computer systems in a peer-to-peer network in the form of a blockchain network, and wherein the first designated private key is stored on a first computer system which is connected to the distributed public transaction ledger through the Internet; (b) providing a second designated key pair, comprising a second designated public key and a corresponding second designated private key, wherein the second designated private key is stored on a second computer system which is physically separated from the first computer system and is not operatively or physically connected to the distributed public transaction ledger or the Internet; (c) providing first smart contract instructions associated with a first smart contract associated with a digital asset token associated with a first contract address associated with the blockchain associated with the underlying digital asset, wherein the first smart contract instructions are saved as part of the blockchain for the underlying digital assets and include: (1) first delegation instructions to delegate one or more first functions associated with the digital asset token to one or more delegated contract addresses associated with the blockchain associated with the underlying digital asset, wherein the one or more delegated contract addresses is different from the first contract address, and wherein a second contract address is designated as one of the one or more delegated contract addresses; and (2) first authorization instructions for the second designated key pair; (d) providing second smart contract instructions associated with a second smart contract associated with the digital asset token associated with the second smart contract address associated with the blockchain associated with the underlying digital asset, wherein the second smart contract instructions are saved as part of the blockchain for the underlying digital asset and include: (1) print limiter token creation instructions indicating conditions under which tokens of the digital asset token are created; (2) second authorization instructions to create tokens of the digital asset token, wherein the first designated key pair is designated to authorize said second authorization instructions to create tokens of the digital asset token; and (3) third authorization instructions with respect to token creation of the digital asset token; wherein the third authorization instructions designate a first designated custodian address with respect to token creation of the digital asset token; (e) providing third smart contract instructions associated with a first designated custodian smart contract associated with the digital asset token associated with a third contract address associated with the blockchain associated with the underlying digital asset, wherein the third contract address is the first designated custodian contract address, and wherein the third smart contract instructions are saved as part of the blockchain associated with the underlying digital asset and include: (1) fourth authorization instructions to authorize issuance of instructions to the second smart contract regarding token creation; wherein the fourth authorization instructions designate the second designated key pair to authorize the fourth authorization instructions; (f) providing fourth smart contract instructions associated with a fourth smart contract associated with the digital asset token associated with a fourth contract address associated with the blockchain associated with the underlying digital asset, wherein the fourth contract address is one of the one or more delegated contract addresses and not: (i) the first contract address, (ii) the second contract address, or (iii) the third contract address, wherein the fourth smart contract instructions are saved as part of the blockchain associated with the underlying digital assets and include: (1) token creation instructions to create tokens of the digital asset token in accordance with conditions set forth by the print limiter token creation instructions; and (2) second delegation instructions delegating data storage operations to at least a fifth contract address; (g) providing fifth smart contract instructions associated with a fifth smart contract associated with the digital asset token associated with the fifth contract address associated with the blockchain associated with the underlying digital asset, wherein the fifth smart contract address is one of the one or more designated store contract addresses, and wherein the fifth smart contract instructions are saved as part of the blockchain for the underlying digital assets and include: (1) data storage instructions for transaction data related to the digital asset token, wherein said transaction data comprises for all issued tokens of the digital asset token: (A) respective public address information associated with the blockchain associated with the underlying digital asset; and (B) corresponding respective token balance information associated with said respective public address information; and (2) fifth authorization instructions to modify the transaction data in response to requests from the fourth contract address; (h) obtaining, by a digital asset exchange computer system associated with a digital asset exchange, a list of designated public addresses and for each designated public address, a respective amount of the digital asset token, wherein a sum of the respective amounts of the digital asset token is a first amount of the digital asset token; (i) increasing the total supply of the digital asset token, by the digital asset exchange computer system, from a second amount to a third amount, wherein the difference between the third amount and the second amount is a fourth amount of digital asset tokens, wherein the fourth amount is either greater than the first amount or equal to the first amount, wherein the digital asset exchange computer system increases the total supply of the digital asset token by performing the following steps: (1) determining, by the digital asset exchange computer system, the first designated private key does not have authority to execute the first request; and (2) increasing, by the digital asset exchange computer system, the total supply of the digital asset token by continuing to perform the following steps: (A) generating, by the digital asset exchange computer system, a first transaction request including a first message comprising a first request to increase the total supply of the digital asset token to the third amount of digital asset tokens; (B) sending, by the digital asset exchange computer system, the first transaction request from the first designated public address to the fifth contract address; (C) sending, by the digital asset exchange computer system, the first transaction request from the fifth contract address to the second contract address; (D) obtaining, by the digital asset exchange computer system, a first unique lock identifier, based on reference to the blockchain; (E) generating, by the digital asset exchange computer system, a second transaction request including a second message comprising a second request to unlock the total supply of the digital asset token in accordance with the first request, wherein the second transaction request further comprises the first unique lock identifier; (F) sending by the digital asset exchange computer system via the underlying blockchain, the second transaction request from the first designated public address to the third contract address associated; (G) obtaining, by the digital asset exchange computer system, a first unique request hash, based on reference to the blockchain; (H) generating, by the digital asset exchange computer system, a third transaction request comprising the first unique request hash, wherein the third transaction request is to be digitally signed by at least the second designated private key; (I) transferring, from the digital asset exchange computer system to a first portable memory device, the third transaction request, wherein the third transaction request is transferred from the first portable memory device to the second computer system, wherein the second computer system generates a third digitally signed transaction request by digitally signing the third transaction request using the second designated private key, and wherein the third digitally signed transaction request is transferred from the second computer system to a second portable memory device; and (J) sending, from the second portable memory device by the digital asset exchange computer system via the underlying blockchain, the third digitally signed transaction request to the third contract address; (j) assigning, by the digital asset exchange computer system in accordance with the list of designated public addresses and respective amount of digital asset token, each respective amount of digital asset token to each respective designated public address; and (k) confirming, by the digital asset exchange computer system, that each respective designated public address received the respective amount of digital asset token.

In embodiments, the list of designated public addresses further comprises: (1) receiving, by the digital asset exchange computer system, a plurality of requests, wherein each request of the plurality of requests comprises: (A) an amount of digital asset token; and (B) a designated public address to receive the amount of digital asset token, wherein the sum of each amount of digital asset token is the first amount of digital asset token; (2) generating, by the digital asset exchange computer system, the list of designated public addresses: and (3) storing, by the digital asset exchange computer system, the list of designated public addresses.

In embodiments, obtaining the list of designated public addresses further comprises: (1) receiving, by the digital asset exchange computer system from a digital asset issuer, a request to distribute a payment amount to a plurality of designated public addresses in exchange for an asset, wherein the request to distribute a payment amount comprises: (A) payment information; (B) a plurality of designated public addresses; (C) a respective amount of the asset associated with each designated public address of the plurality of designated public addresses, wherein the asset is not the digital asset token, wherein the asset has a corresponding first value, and wherein the digital asset token has a corresponding second value, wherein the payment information indicates that the payment amount is the first amount of digital asset; (2) accessing, by the digital asset exchange computer system, a digital asset security token database to determine: (A) each respective designated public address of the plurality of designated public addresses; and (B) a respective digital asset security token amount associated with each respective designated public address; (2) determining a respective payment amount in the digital asset token to be made to each respective designated public address based at least in part on: (A) the first value; and (B) the second value; (3) generating, by the digital asset exchange computer system, the list of designated public addresses based at least on: (A) each respective payment amount; and (B) each respective designated public address; and (3) storing, by the digital asset exchange computer system, the list of designated public addresses, wherein confirming that each designated public address received the respective amount of digital asset tokens is determined based at least in part on: (1) each respective digital asset security token amount; (2) each respective payment amount; and (3) each respective designated public address. In embodiments, the payment information comprises: (1) a respective amount of digital asset token for each designated public address of the plurality of designated public addresses, wherein a first sum of each respective amount of digital asset token is the first amount of digital asset token. In embodiments, determining a respective payment amount in the digital asset token further comprises: (A) determining, by the digital asset exchange computer system, the first value; (B) determining, by the digital asset exchange computer system, a difference between the first value and the second value; (C) determining, by the digital asset exchange computer system, a second respective amount of the digital asset token for each designated public address of the plurality of designated public addresses based on at least: (i) the first value; (ii) the second value; and (iii) the difference between the first value and the second value; and (D) associating, by the digital asset exchange computer system for each designated public address, the second respective amount.

In embodiments, the method further comprises the steps of: (l) providing user identification data corresponding to a plurality of customers of the digital asset exchange, wherein the user identification data comprises whitelist data comprising a pre-approved designated address list associated with a first customer of the plurality of customers of the digital asset exchange, wherein the pre-approved designated address list comprises one or more pre-approved public address, and wherein the first customer is associated with a first customer public address of the plurality of customer public addresses; (k) determining, prior to increasing the total supply of the digital asset token, by the digital asset exchange computer system, whether the respective designated public address associated with the respective request received from the first customer public address is included on the pre-approved designated address list; (m) in the case where the respective designated public address is not included on the pre-approved designated address list, generating, by the digital asset exchange computer system, a notification indicating that the respective designated public address associated with the respective request received from the first customer public address is not approved for receiving digital assets associated with the first customer; (n) sending, by the digital asset exchange computer system to a customer device associated with the first customer, the notification; and (o) cancelling, by the digital asset exchange computer system, the respective request received from the first customer public address.

In embodiments, the second computer system is a hardware security module.

In embodiments, the second smart contract instructions include sixth authorization instructions related to modifying a token supply of the digital asset token.

In embodiments, the second authorization instructions for the first designated key pair with respect to token creation of the digital asset token include instructions limiting token creation above a first threshold over a first period of time. In embodiments, the fourth authorization instructions for the second designated key set to authorize the issuance of instructions to the second smart contract with respect to token creation include instructions to allow for creation of digital asset tokens above the first threshold during the first period of time.

In embodiments, the third smart contract instructions further include: (2) sixth authorization instructions to designate a seventh contract address as one of the one or more delegated contract addresses, wherein the seventh contract address is not the second contract address, and wherein the second designated key pair is designated to authorize the sixth authorization instructions.

In embodiments, the fourth smart contract instructions further include: (3) token transfer instructions related to transferring tokens of the digital asset token from a first designated contract address to a second designated contract address associated with the underlying digital asset.

In embodiments, the fourth smart contract instructions further include: (3) token destruction instructions related to destroying a fifth amount of digital asset tokens.

In embodiments, the fourth smart contract instructions further include: (3) token balance modification instructions related to modifying a total number of tokens of the digital asset token assigned to a third designated public address.

In embodiments, the fourth smart contract instructions further include: (3) token transfer instructions related to transferring tokens of the digital asset token from a first designated contract address to a second designated contract address; and (4) token destruction instructions related to destroying one or more tokens of the digital asset token.

In embodiments, the method further comprises receiving, prior to generating the fourth amount of digital asset tokens, a validating request.

In embodiments, the first transaction request includes first transaction fee information for miners in the blockchain network to process the first transaction request.

In embodiments, fifth contract returns the balance of digital asset tokens to the fourth smart contract address.

In embodiments, the fifth contract returns the balance of digital asset tokens to the second smart contract address.

In embodiments, the underlying digital asset is NEO.

In embodiments, the underlying digital asset is ETHER.

In embodiments, the first designated private key is mathematically related to a first designated public key, In embodiments, the first designated public address is the first designated public key.

In embodiments, the first designated public address is derived using a cryptographic hash function of the first designated public key. In embodiments, the first designated public address is a result of the cryptographic hash function. In embodiments, the first designated public address is at least part of a result of the cryptographic hash function.

In embodiments, the second designated private key is mathematically related to a second designated public key.

In embodiments, a method of increasing a total supply of digital asset tokens comprising the steps of: (a) providing a first designated key pair, comprising a first designated public key and a corresponding first designated private key, wherein the first designated public key also corresponds to a first designated public address associated with an underlying digital asset; wherein the underlying digital asset is maintained on a distributed public transaction ledger maintained in the form of a blockchain by a plurality of geographically distributed computer systems in a peer-to-peer network in the form of a blockchain network, and wherein the first designated private key is stored on a first computer system which is connected to the distributed public transaction ledger through the Internet; (b) providing a second designated key pair, comprising a second designated public key and a corresponding second designated private key, wherein the second designated private key is stored on a second computer system which is physically separated from the first computer system and is not operatively or physically connected to the distributed public transaction ledger or the Internet; (c) providing first smart contract instructions associated with a first smart contract associated with a digital asset token associated with a first contract address associated with the blockchain associated with the underlying digital asset, wherein the first smart contract instructions are saved as part of the blockchain for the underlying digital assets and include: (1) first delegation instructions to delegate one or more first functions associated with the digital asset token to one or more delegated contract addresses associated with the blockchain associated with the underlying digital asset, wherein the one or more delegated contract addresses is different from the first contract address, and wherein a second contract address is designated as one of the one or more delegated contract addresses; and (2) first authorization instructions for the second designated key pair; (d) providing second smart contract instructions associated with a second smart contract associated with the digital asset token associated with the second smart contract address associated with the blockchain associated with the underlying digital asset, wherein the second smart contract instructions are saved as part of the blockchain for the underlying digital asset and include: (1) print limiter token creation instructions indicating conditions under which tokens of the digital asset token are created; (2) second authorization instructions to create tokens of the digital asset token, wherein the first designated key pair is designated to authorize said second authorization instructions to create tokens of the digital asset token; and (3) third authorization instructions with respect to token creation of the digital asset token; wherein the third authorization instructions designate a first designated custodian address with respect to token creation of the digital asset token; (e) providing third smart contract instructions associated with a first designated custodian smart contract associated with the digital asset token associated with a third contract address associated with the blockchain associated with the underlying digital asset, wherein the third contract address is the first designated custodian contract address, and wherein the third smart contract instructions are saved as part of the blockchain associated with the underlying digital asset and include: (1) fourth authorization instructions to authorize issuance of instructions to the second smart contract regarding token creation; wherein the fourth authorization instructions designate the second designated key pair to authorize the fourth authorization instructions; (f) providing fourth smart contract instructions associated with a fourth smart contract associated with the digital asset token associated with a fourth contract address associated with the blockchain associated with the underlying digital asset, wherein the fourth contract address is one of the one or more delegated contract addresses and not: (i) the first contract address, (ii) the second contract address, or (iii) the third contract address, wherein the fourth smart contract instructions are saved as part of the blockchain associated with the underlying digital assets and include: (1) token creation instructions to create tokens of the digital asset token in accordance with conditions set forth by the print limiter token creation instructions; and (2) second delegation instructions delegating data storage operations to at least a fifth contract address; (g) providing fifth smart contract instructions associated with a fifth smart contract associated with the digital asset token associated with the fifth contract address associated with the blockchain associated with the underlying digital asset, wherein the fifth smart contract address is one of the one or more designated store contract addresses, and wherein the fifth smart contract instructions are saved as part of the blockchain for the underlying digital assets and include: (1) data storage instructions for transaction data related to the digital asset token, wherein said transaction data comprises for all issued tokens of the digital asset token: (A) respective public address information associated with the blockchain associated with the underlying digital asset; and (B) corresponding respective token balance information associated with said respective public address information; and (1) fifth authorization instructions to modify the transaction data in response to requests from the fourth contract address; (h) obtaining, by a digital asset exchange computer system associated with a digital asset exchange, a list of designated public addresses and for each designated public address, a respective amount of the digital asset token, wherein a sum of each respective amount of the digital asset token is a first amount of the digital asset token; (i) increasing the total supply of the digital asset token, by the digital asset exchange computer system, from a second amount to a third amount, wherein the difference between the third amount and the second amount is a fourth amount of digital asset tokens, wherein the fourth amount is either greater than the first amount or equal to the first amount, wherein the digital asset exchange computer system increases the total supply of the digital asset token by performing the following steps: (1) determining, by the digital asset exchange computer system, the first designated private key has the authority to execute the first request; and (2) increasing, by the digital asset exchange computer system, the total supply of the digital asset token by continuing to perform the following steps: (A) generating and sending, by the digital asset exchange computer system via the blockchain, a first transaction request: (i) to the fifth contract address; and (ii) including a first message comprising a first request to generate the fourth amount of digital asset tokens; wherein the first transaction request is digitally signed by the first designated private key, wherein the fifth smart contract executes, via the plurality of geographically distributed computer systems in the peer-to-peer network with reference to the blockchain, the first transaction request to: validate the authority of the first designated private key to call the second smart contract to execute the plurality of requests; and (iii) send a first call to the fourth contract address to generate the fourth amount of digital asset tokens, wherein the fourth smart contract executes, via the plurality of geographically distributed computer systems in the peer-to-peer network with reference to the blockchain, the first call to generate the first unique lock identifier, and return to the second smart contract address, the first unique lock identifier, wherein, in response to the return of the first unique lock identifier, the second smart contract executes, via the plurality of geographically distributed computer systems in the peer-to-peer network with reference to the blockchain, a second call to the fourth smart contract address to confirm the first call with the first lock identifier, wherein, in response, the fourth smart contract executes, via the plurality of geographically distributed computer systems in the peer-to-peer network with reference to the blockchain, the first call to execute a third call to the fifth contract address to obtain the total supply of digital asset tokens in circulation, wherein, in response, the fifth smart contract executes, via the plurality of geographically distributed computer systems in the peer-to-peer network with reference to the blockchain, the third call and returns, to the fourth contract address, the second amount of digital asset tokens corresponding to the total supply of digital asset tokens in circulation, wherein, in response to the return of the second amount, the fourth smart contract, executes via the plurality of geographically distributed computer systems in the peer-to-peer network with reference to the blockchain, a fourth call request to the fifth contract address to set a new total supply of digital asset tokens in circulation to the third amount, wherein, in response to the fourth call, the fifth smart contract, executes via the plurality of geographically distributed computer systems in the peer-to-peer network with reference to the blockchain, the fourth call and sets the new total supply of digital asset tokens in circulation to the third amount; (j) assigning, by the digital asset exchange computer system in accordance with the list of designated public addresses and respective amount of digital asset token, each respective amount of digital asset token to each respective designated public address; and (k) confirming, by the digital asset exchange computer system, that each designated public address received the respective amount of digital asset token.

In embodiments, obtaining the list of designated public addresses further comprises: (1) receiving, by the digital asset exchange computer system, a plurality of requests, wherein each request of the plurality of requests comprises: (A) an amount of digital asset token; and (B) a designated public address to receive the amount of digital asset token, wherein the sum of each amount of digital asset token is the first amount of digital asset token; (1) generating, by the digital asset exchange computer system, the list of designated public addresses; and (2) storing, by the digital asset exchange computer system, the list of designated public addresses.

In embodiments, obtaining the list of designated public addresses further comprises: (1) receiving, by the digital asset exchange computer system from a digital asset issuer, a request to distribute a payment amount to a plurality of designated public addresses in exchange for an asset, wherein the request to distribute a payment amount comprises: (A) payment information; (B) a plurality of designated public addresses; (C) a respective amount of the asset associated with each designated public address of the plurality of designated public addresses, wherein the asset is not the digital asset token, wherein the asset has a corresponding first value, and wherein the digital asset token has a corresponding second value, wherein the payment information indicates that the payment amount is the first amount of digital asset; (m) accessing, by the digital asset exchange computer system, a digital asset security token database to determine: (A) each respective designated public address of the plurality of designated public addresses; and (B) a respective digital asset security token amount associated with each respective designated public address; (n) determining a respective payment amount in the digital asset token to be made to each respective designated public address based at least in part on: (A) the first value; and (B) the second value; (o) generating, by the digital asset exchange computer system, the list of designated public addresses based at least on: (A) each respective payment amount; and (1) each respective designated public address; and (2) storing, by the digital asset exchange computer system, the list of designated public addresses, wherein confirming that each designated public address received the respective amount of digital asset tokens is determined based at least in part on: (1) each respective digital asset security token amount; (2) each respective payment amount; and (3) each respective designated public address. In embodiments, the payment information comprises: (i) a respective amount of digital asset token for each designated public address of the plurality of designated public addresses, wherein a first sum of each respective amount of digital asset token is the first amount of digital asset token. In embodiments, determining a respective payment amount in the digital asset token further comprises: (A) determining, by the digital asset exchange computer system, the first value; (B) determining, by the digital asset exchange computer system, a difference between the first value and the second value; (C) determining, by the digital asset exchange computer system, a second respective amount of the digital asset token for each designated public address of the plurality of designated public addresses based on at least: (i) the first value; (ii) the second value; and (iii) the difference between the first value and the second value; and (D)

associating, by the digital asset exchange computer system for each designated public address, the second respective amount.

In embodiments, the method further comprises the steps of: (l) providing user identification data corresponding to a plurality of customers of the digital asset exchange, wherein the user identification data comprises a pre-approved designated address list associated with a first customer of the plurality of customers of the digital asset exchange, wherein the pre-approved designated address list comprises a pre-approved public address, and wherein the first customer is associated with a first customer public address of the plurality of customer public addresses; (m) determining, prior to increasing the total supply of the digital asset token, by the digital asset exchange computer system, whether the respective designated public address associated with the respective request received from the first customer public address in included in the pre-approved designated address list; (n) in the case where the first designated address is included in the pre-approved designated address list, generating, by the digital asset exchange computer system, a notification indicating that the respective designated public address associated with the respective request received from the first customer public address is not approved for receiving digital assets associated with the first customer; (o) sending, by the digital asset exchange computer system to a customer device associated with the first customer, the notification; and (p) cancelling, by the digital asset exchange computer system, the respective request received from the first customer public address.

In embodiments, the second computer system is a hardware security module.

In embodiments, the second smart contract instructions include sixth authorization instructions related to modifying a token supply of the digital asset token.

In embodiments, the second authorization instructions for the first designated key pair with respect to token creation of the digital asset token include instructions limiting token creation above a first threshold over a first period of time. In embodiments, the fourth authorization instructions for the second designated key set to authorize the issuance of instructions to the second smart contract with respect to token creation include instructions to allow for creation of digital asset tokens above the first threshold during the first period of time. In embodiments, the third smart contract instructions further include: (2) sixth authorization instructions to designate a seventh contract address as one of the one or more delegated contract addresses, wherein the seventh contract address is not the second contract address, and wherein the second designated key pair is designated to authorize the sixth authorization instructions.

In embodiments, the fourth smart contract instructions further include: (3) token transfer instructions related to transferring tokens of the digital asset token from a first designated contract address to a second designated contract address associated with the underlying digital asset.

In embodiments, the fourth smart contract instructions further include: (3) token destruction instructions related to destroying a fifth amount of digital asset tokens.

In embodiments, the fourth smart contract instructions further include: (3) token balance modification instructions related to modifying a total number of tokens of the digital asset token assigned to a third designated public address.

In embodiments, the fourth smart contract instructions further include: (3) token transfer instructions related to transferring tokens of the digital asset token from a first designated contract address to a second designated contract address; and (4) token destruction instructions related to destroying one or more tokens of the digital asset token.

In embodiments, the method further comprises receiving, prior to generating the fourth amount of digital asset tokens, a validating request.

In embodiments, the first transaction request includes first transaction fee information for miners in the blockchain network to process the first transaction request.

In embodiments, the fifth contract returns the balance of digital asset tokens to the fourth smart contract address.

In embodiments, the fifth contract returns the balance of digital asset tokens to the second smart contract address.

In embodiments, the underlying digital asset is NEO. In embodiments, the underlying digital asset is ETHER.

In embodiments, the first designated private key is mathematically related to a first designated public key, In embodiments, the first designated public address is the first designated public key.

In embodiments, the first designated public address is derived using a cryptographic hash function of the first designated public key.

In embodiments, the first designated public address is a result of the cryptographic hash function. In embodiments, the first designated public address is at least part of a result of the cryptographic hash function.

In embodiments, the second designated private key is mathematically related to a second designated public key.

In embodiments, a method for increasing the total supply of a digital asset token comprises: (a) providing a first designated key pair, including a first designated public key and a corresponding first designated private key, wherein the first designated public key also corresponds to a first designated public address associated with an underlying digital asset; wherein the underlying digital asset is maintained on a distributed public transaction ledger maintained in the form of a blockchain by a plurality of geographically distributed computer systems in a peer-to-peer network in the form of a blockchain network, and wherein the first designated private key is stored on a first computer system which is connected to the distributed public transaction ledger through the Internet; (b) providing a second designated key pair, including a second designated public key and a corresponding second designated private key, wherein the second designated public key also corresponds to a first designated public address associated with the underlying digital asset; wherein the second designated private key is stored on a second computer system which is physically separated from the first computer system and is not operatively or physically connected to the distributed public transaction ledger or the Internet; (c) providing first smart contract instructions associated with a first smart contract associated with a digital asset token associated with a first contract address associated with the blockchain associated with the underlying digital asset, wherein the first smart contract instructions are saved as part of the blockchain for the underlying digital asset and include: (1) first delegation instructions to delegate one or more first functions associated with the digital asset token to one or more delegated contract addresses associated with the blockchain associated with the underlying digital asset, wherein the one or more delegated contract addresses are different from the first contract address, and wherein a second contract address is designated as one of the one or more delegated contract addresses; (2) first authorization instructions associated with the second designated key pair; (d) providing second smart contract instructions associated with a second smart contract associated with the digital asset token associated with the second contract address associated with the blockchain associated with the underlying digital asset, wherein the second smart contract instructions are saved as part of the blockchain for the underlying digital assets and include: (1) print limiter token creation instructions indicating conditions under which tokens of the digital asset token are created; (2) second authorization instructions to create tokens of the digital asset token, wherein the first designated key pair is designated to authorize said second authorization instructions to create tokens of the digital asset token; (3) third authorization instructions with respect to token creation of the digital asset token; wherein the third authorization instructions designate a first designated custodian address with respect to token creation of the digital asset token; (e) providing third smart contract instructions associated with a first designated custodian contract associated with the digital asset token associated with a third contract address associated with the blockchain associated with the underlying digital asset, wherein the third contract address is the first designated custodian contract address, and wherein the third smart contract instructions are saved as part of the blockchain for the underlying digital assets and include: (1) fourth authorization instructions to authorize issuance of instructions to the second smart contract regarding token creation; wherein the fourth authorization instructions designate the second designated key pair to authorize the fourth authorization instructions; (f) providing fourth smart contract instructions associated with a fourth smart contract associated with the digital asset token associated with a fourth contract address associated with the blockchain associated with the underlying digital asset, wherein the fourth contract address is one of the one or more delegated contract addresses and not: (i) the first contract address, (ii) the second contract address, or (iii) the third contract address, wherein the fourth smart contract instructions are saved as part of the blockchain associated with the underlying digital assets and include: (1) token creation instructions to create tokens of the digital asset tokens in accordance with conditions set forth by the print limiter token creation instructions; (2) second delegation instructions delegating data storage operations to at least a fifth contract address; (g) providing fifth smart contract instructions associated with a fifth smart contract associated with the digital asset token associated with the fifth contract address associated with the blockchain associated with the underlying digital asset, wherein the fifth contract address is one of one or more designated store contract addresses, and wherein the fifth smart contract instructions are saved as part of the blockchain for the underlying digital assets and include: (1) data storage instructions for transaction data related to the digital asset token, wherein the transaction data includes for all issued tokens of the digital asset token: (A) respective public address information associated with the blockchain associated with the underlying digital asset; and (B) corresponding respective token balance information associated with said respective public address information; (2) fifth authorization instructions to modify the transaction data in response to a request from the fourth contract address; (h) increasing the total supply of the digital asset tokens, by a digital asset token issuer system, from a first amount of the digital asset tokens to a second amount of the digital asset tokens, including the steps of: (1) generating, by the digital asset token issuer system, a first transaction request including a first message including a first request to increase the total supply of the digital asset tokens to the second amount of digital asset tokens, to the fourth contract address, wherein the first transaction request is digitally signed by the first designated private key; (2) sending, by the digital asset token issuer system via the blockchain network, the first transaction request from the first designated public address to the fourth contract address; (3) sending, by the digital asset token issuer system via the blockchain network, the first transaction request from the fourth contract address to the second contract address; wherein the second smart contract executes, via the plurality of geographically distributed computer systems in the peer-to-peer network with reference to the blockchain, the first transaction request to return a first unique lock identifier associated with the first transaction request; (4) obtaining, by the digital asset token issuer system, the first unique lock identifier, based on reference to the blockchain; (5) generating, by the digital asset token issuer system, a second transaction request including a second message including a second request to unlock the total supply of the digital asset tokens in accordance with the first request and including the first unique lock identifier, wherein the second transaction request being to the third contract address, and digitally signed by the first designated private key; (6) sending, by the digital asset token issuer system via the blockchain network, the second transaction request from the first designated public address to the third contract address, wherein the third smart contract executes, via the plurality of geographically distributed computer systems in the peer-to-peer network with reference to the blockchain, the second transaction request to return a first unique request hash associated with the second transaction request; (7) obtaining, by the digital asset token issuer system, the first unique request hash, based on reference to the blockchain; (8) generating, by the digital asset token issuer system, a third transaction request to be digitally signed by at least the second designated private key including the first unique request hash; (9) transferring, from the digital asset token issuer system to a first portable memory device, the third transaction request; (10) transferring, from the first portable memory device to the second computer system, the third transaction request; (11) digitally signing, by the second computer system, the third transaction request using the second designated private key to generate a third digitally signed transaction request; (12) sending, from the second portable memory device using the digital asset token issuer system, via the blockchain network, the third digitally signed transaction request to the third contract address; wherein the third smart contract, executes, via the plurality of geographically distributed computer systems in the peer-to-peer network with reference to the blockchain, the third digitally signed transaction request to validate the second request to unlock based on the third digitally signed transaction request and the first unique request hash and executes a first call to the second contract address, to increase the total supply of the digital asset tokens to the second amount of digital asset tokens, wherein the second contract address returns the first call to the fourth contract address and the fourth smart contract executes, via the plurality of geographically distributed computer systems in the peer-to-peer network with reference to the blockchain, a second call to the fifth contract address to set the total supply of the digital asset tokens to the second amount of digital asset tokens, wherein the fifth smart contract executes, via the plurality of geographically distributed computer systems in the peer-to-peer network with reference to the blockchain, the second call to set the total supply of the digital asset tokens to the second amount of digital asset tokens; and (i) confirming, by the digital asset token issuer system, the total supply of digital asset tokens is set to the second amount of digital asset tokens based on reference to the blockchain.

In embodiments, the first designated key pair includes an additional designated key pair including a first additional designated public key and a corresponding first additional designated private key, wherein the first additional designated public key also corresponds to a first additional designated public address associated with the underlying digital asset.

In embodiments, the second computer system is a hardware storage module. In embodiments, the second designated key set includes an additional designated key set including a second additional designated public address and a second additional designated private key.

In embodiments, the second authorization instructions for the first designated key set with respect to token creation of the digital asset token includes instructions limiting creation of digital asset tokens above a first threshold amount over a first period of time.

In embodiments, the fourth authorization instructions include instructions to permit creation of digital asset tokens above the first threshold during the first period of time, wherein the fourth authorization instructions designate the second designated key pair to authorize the instructions to permit creation of digital asset tokens above the first threshold.

In embodiments, the third smart contract instructions further include: (2) sixth authorization instructions to designate a seventh contract address as one of the one or more delegated contract addresses, wherein the seventh contract address is not the second contract address, and wherein the second designated key pair is designated to authorize the sixth authorization instructions.

In embodiments, the fourth smart contract instructions further include: (3) token transfer instructions related to transferring issued tokens of the digital asset token from a first designated contract address to a second designated contract address. In embodiments, the fourth smart contract instructions further include: (3) token destruction instructions related to destroying one or more issued token of the digital asset token. In embodiments, the fourth smart contract instructions further include: (3) token transfer instructions related to transferring issued tokens of the digital asset token from a first designated contract address to a second designated contract address; and (4) token destruction instructions related to destroying one or more issued tokens of the digital asset token.

In embodiments, the second smart contract instructions further include: (4) token balance modification instructions related to modifying the total balance of tokens of the digital asset token assigned to a third designated address.

In embodiments, the first transaction request includes first transaction fee information for miners associated with the plurality of geographically distributed computer systems in the peer-to-peer network to process the first transaction request. In embodiments, the second transaction request includes second transaction fee information for miners associated with the plurality of geographically distributed computer systems in the peer-to-peer network to process the second transaction request.

In embodiments, the first portable memory device includes the second portable memory device.

In embodiments, the second smart contract instructions include sixth authorization instructions to modify the total token supply amount of the digital asset tokens.

In embodiments, the underlying digital asset is a stable value token. In embodiments, the underlying digital asset is NEO. In embodiments, the underlying digital asset is ETHER. In embodiments, the underlying digital asset is BITCOIN.

In embodiments, the first designated private key is mathematically related to a first designated public key.

In embodiments, the first designated public address includes the first designated public key.

In embodiments, the first designated public address includes a hash of the first designated public key.

In embodiments, the first designated public address includes a partial hash of the first designated public key.

In embodiments, the second designated private key is mathematically related to a second designated public key.

In embodiments, the second designated public address includes the second designated public key.

In embodiments, the second designated public address includes a hash of the second designated public key.

In embodiments, the second designated public address includes a partial hash of the second designated public key.

In embodiments, a method of increasing a total supply of digital asset tokens including the steps of: (a) providing a first designated key pair, including a first designated public key and a corresponding first designated private key, wherein the first designated public key also corresponds to a first designated public address associated with an underlying digital asset; wherein the underlying digital asset is maintained on a distributed public transaction ledger maintained in the form of a blockchain by a plurality of geographically distributed computer systems in a peer-to-peer network in the form of a blockchain network, and wherein the first designated private key is stored on a first computer system which is connected to the distributed public transaction ledger through the Internet; (b) providing a second designated key pair, including a second designated public key and a corresponding second designated private key wherein the second designated public key also corresponds to a second designated public address associated with the underlying digital asset, wherein the second designated private key is stored on a second computer system which is physically separated from the first computer system and is not operatively or physically connected to the distributed public transaction ledger or the Internet; (c) providing first smart contract instructions associated with a first smart contract associated with a digital asset token associated with a first contract address associated with the blockchain associated with the underlying digital asset, wherein the first smart contract instructions are saved as part of the blockchain for the underlying digital assets and include: first delegation instructions to delegate one or more first functions associated with the digital asset token to one or more delegated contract addresses associated with the blockchain associated with the underlying digital asset, wherein the one or more delegated contract addresses is different from the first contract address, and wherein a second contract address is designated as one of the one or more delegated contract addresses; (1) first authorization instructions for the second designated key pair; (d) providing second smart contract instructions associated with a second smart contract associated with the digital asset token associated with the second smart contract address associated with the blockchain associated with the underlying digital asset, wherein the second smart contract instructions are saved as part of the blockchain for the underlying digital asset and include: (1) print limiter token creation instructions indicating conditions under which tokens of the digital asset token are created; (2) second authorization instructions to create tokens of the digital asset token, wherein the first designated key pair is designated to authorize said second authorization instructions to create tokens of the digital asset token; and (3) third authorization instructions with respect to token creation of the digital asset token; wherein the third authorization instructions designate a first designated custodian address with respect to token creation of the digital asset token; (e) providing third smart contract instructions associated with a first designated custodian smart contract associated with the digital asset token associated with a third contract address associated with the blockchain associated with the underlying digital asset, wherein the third contract address is the first designated custodian contract address, and wherein the third smart contract instructions are saved as part of the blockchain associated with the underlying digital asset and include: fourth authorization instructions to authorize issuance of instructions to the second smart contract regarding token creation; wherein the fourth authorization instructions designate the second designated key pair to authorize the fourth authorization instructions; providing fourth smart contract instructions associated with a fourth smart contract associated with the digital asset token associated with a fourth contract address associated with the blockchain associated with the underlying digital asset, wherein the fourth contract address is one of the one or more delegated contract addresses and not: (i) the first contract address, (ii) the second contract address, or (iii) the third contract address, wherein the fourth smart contract instructions are saved as part of the blockchain associated with the underlying digital assets and include: (1) token creation instructions to create tokens of the digital asset token in accordance with conditions set forth by the print limiter token creation instructions; and (2) second delegation instructions delegating data storage operations to at least a fifth contract address; (f) providing fifth smart contract instructions associated with a fifth smart contract associated with the digital asset token associated with the fifth contract address associated with the blockchain associated with the underlying digital asset, wherein the fifth smart contract address is one of the one or more designated store contract addresses, and wherein the fifth smart contract instructions are saved as part of the blockchain for the underlying digital assets and include: (1) data storage instructions for transaction data related to the digital asset token, wherein said transaction data includes for all issued tokens of the digital asset token: (A) respective public address information associated with the blockchain associated with the underlying digital asset; and (B) corresponding respective token balance information associated with said respective public address information; (1) fifth authorization instructions to modify the transaction data in response to requests from the fourth contract address; (g) receiving, by a digital asset token issuer system, a request to generate and assign to the first designated public address a first amount of digital asset tokens; (h) generating, by the digital asset token issuer system, the first amount of digital asset tokens and assigning said first amount of digital asset tokens to the first designated public address increasing the total supply of the digital asset tokens, including the steps of: (1) generating, by the digital asset token issuer system, and sending, using the digital asset token issuer system via the blockchain network, a first transaction request: (A) to the fourth contract address; and (B) including a first message including a first request to generate the first amount of digital asset tokens and assign said first amount of digital asset tokens to the first designated public address; wherein the first transaction request is digitally signed by the first designated private key; wherein the fourth smart contract executes, via the plurality of geographically distributed computer systems in the peer-to-peer network with reference to the blockchain, the first transaction request to: (i) validate the first request and the authority of the first designated private key to call the second smart contract to execute the first request; and (ii) send a first call to the fourth contract address to generate and assign to the first designated public address the first amount of digital asset tokens; wherein the fourth smart contract executes, via the plurality of geographically distributed computer systems in the peer-to-peer network with reference to the blockchain, the first call to generate a first unique lock identifier, and return to the second smart contract address, the first unique lock identifier; wherein, in response to the return of the first unique lock identifier, the second smart contract executes, via the plurality of geographically distributed computer systems in the peer-to-peer network with reference to the blockchain, a call to the fourth smart contract address to confirm the first call with the first lock identifier; wherein, in response, the fourth smart contract executes, via the plurality of geographically distributed computer systems in the peer-to-peer network with reference to the blockchain, the first call to execute a second call to the fifth contract address to obtain the total supply of digital asset tokens in circulation; wherein, in response, the fifth smart contract executes, via the plurality of geographically distributed computer systems in the peer-to-peer network with reference to the blockchain, the second call and returns, to the fourth contract address, a second amount of digital asset tokens corresponding to the total supply of digital asset tokens in circulation; wherein, in response to the return of the second amount, the fourth smart contract, executes via the plurality of geographically distributed computer systems in the peer-to-peer network with reference to the blockchain, a third call request to the fifth contract address to set a new total supply of digital asset tokens in circulation to a third amount, which is the total of the first amount and the second amount; wherein, in response to the third call, the fifth smart contract, executes via the plurality of geographically distributed computer systems in the peer-to-peer network with reference to the blockchain, the third call and sets a new total supply of digital asset tokens in circulation at the third amount; wherein, the fourth smart contract executes, via the plurality of geographically distributed computer systems in the peer-to-peer network with reference to the blockchain, a fourth call to the fifth contract address to add the first amount of digital asset tokens to a respective balance associated with the first designated public address; wherein, in response, the fifth smart contract executes, via the plurality of geographically distributed computer systems in the peer-to-peer network with reference to the blockchain, the fourth call to set the balance of digital asset tokens in the first designated public address at a fourth amount which includes the addition of the first amount to the previous balance; and (i) confirming, by the digital asset token issuer system, that the balance of digital asset tokens associated with the first designated public address is set to include the first amount of digital asset tokens based on reference to the blockchain.

In embodiments, the second computer system is a hardware storage module.

In embodiments, the second designated key set includes an additional designated key set including an additional designated public address and an additional designated private key.

In embodiments, the second authorization instructions for the first designated key set with respect to token creation of the digital asset token include instruction limiting token creation above a first threshold over a first period of time. In embodiments, the fourth authorization instructions for the second designated key set to authorize the issuance of instructions to the second smart contract instructions with respect to token creation include instructions to allow for creation of digital asset tokens above the first threshold during the first period of time. In embodiments, the third smart contract instructions further include: (2) sixth authorization instructions to designate a seventh contract address as one of the one or more delegated contract addresses, wherein the seventh contract address is not the second contract address, and wherein the second designated key set is designated to authorize the sixth authorization instructions.

In embodiments, the fourth smart contract instructions further include: (3) token transfer instructions related to transferring tokens of the digital asset token from a first designated contract address to a second designated contract address. In embodiments, the fourth smart contract instructions further include: (3) token destruction instructions related to destroying one or more digital asset token. In embodiments, the fourth smart contract instructions further include: (3) token balance modification instructions related to modifying a total number of tokens of the digital asset token assigned to a third designated public address. In embodiments, the fourth smart contract instructions further include: (3) token transfer instructions related to transferring tokens of the digital asset token from a first designated contract address to a second designated contract address; and (4) token destruction instructions related to destroying one or more tokens of the digital asset token.

In embodiments, the method further includes receiving, prior to generating the first amount of digital asset tokens, a validating request. In embodiments, the method further includes determining the first designated key set has authority to process the request to generate the first amount of digital tokens.

In embodiments, the first transaction request includes first transaction fee information for miners in the plurality of geographically distributed computer systems in the peer-to-peer network to process the first transaction request.

In embodiments, the fifth contract returns the balance of digital asset tokens to the fourth smart contract address. In embodiments, the fifth contract returns the balance of digital asset tokens to the second smart contract address.

In embodiments, the method further includes the steps of: (k) receiving, by the plurality of geographically distributed computer systems in the peer-to-peer network, from a first user device associated with the first designated public address, via the underlying blockchain, a second transaction request: (A) from the first designated public address; (B) to the first contract address; and (C) including a second message including a second request to transfer a fifth amount of digital assets from the first designated public address to a third designated public address; wherein the first transaction request is digitally signed by the first designated private key, which is mathematically related to the first designated public address; wherein the first user device had access to the first designated private key prior to sending the second transaction request; wherein the first smart contract executes, via the plurality of geographically distributed computer systems in the peer-to-peer network, the second transaction request to execute, via the plurality of geographically distributed computer systems in the peer-to-peer network, a sixth call request to the fourth contract address to transfer a fifth amount of digital assets from the first designated public address to the third designated public address; wherein, in response to the sixth call request, the fourth smart contract, executes via the plurality of geographically distributed computer systems in the peer-to-peer network, sixth authorization instructions to verify the sixth call came from an authorized contract address, and upon verification, to execute a seventh call request to the fifth contract address to obtain a sixth amount of digital asset tokens which reflect a current balance of digital asset tokens associated with the first designated public address; wherein, in response to the seventh call request, the fifth smart contract, executes via the plurality of geographically distributed computer systems in the peer-to-peer network, the seventh call request to return the sixth amount of digital asset tokens; wherein, in response to the return of the sixth amount of digital asset, the fourth smart contract executes, via the plurality of geographically distributed computer systems in the peer-to-peer network: (1) a balance verification instruction to confirm that the fifth amount of digital asset tokens is less than or equal to the sixth amount of digital asset tokens, and (2) in the case where the fifth amount of digital asset tokens is less than or equal to the sixth amount of digital asset tokens, execute, via the plurality of geographically distributed computer systems in the peer-to-peer network, a seventh call request to the fifth contract address to set a new balance for the digital asset tokens in the first designated public address to a seventh amount which equals the sixth amount less the fifth amount; wherein, in response to the seventh call, the fifth smart contract executes, via the plurality of geographically distributed computer systems in the peer-to-peer network, the seventh call to set and store the new balance for the first designated public address as the seventh amount and returns a new balance for the first designated public address as the seventh amount; wherein, in response to the return of the new balance, the fourth smart contract executes, via the plurality of geographically distributed computer systems in the peer-to-peer network, an eighth call to add the second amount of digital asset tokens to the balance associated with the third designated public address; wherein, in response to the eighth call request, the fifth smart contract executes, via the blockchain network, the eighth call request to set the balance of digital asset tokens associated with the third designated public address at a seventh amount which includes the addition of the second amount to a previous balance associated with the third designated public address; and wherein the first user device confirms that the balance of digital asset tokens associated with the first designated public address is the sixth amount of digital asset tokens based on reference to the blockchain.

In embodiments, the second transaction request includes second transaction fee information for miners in the plurality of geographically distributed computer systems in the peer-to-peer network to process the second transaction request. In embodiments, the balance of digital asset tokens associated with the third designated public address is returned to the fourth contract address. In embodiments, the balance of digital asset tokens associated with the third public address is returned to the first smart contract address. In embodiments, a second user device confirms that the balance of the digital asset tokens associated with the third designated public address is the seventh amount of digital asset tokens based on reference to the blockchain.

In embodiments, the method further includes the steps of: (k) providing a third designated key set, including a third designated public address associated with the underlying digital asset and a corresponding third designated private key, and wherein the third designated private key is stored on a third computer system which is connected to the distributed public transaction ledger through the Internet;

and (1) receiving, by the plurality of geographically distributed computer systems in the peer-to-peer network, from the third computer system, via the blockchain, a second transaction request: (A) from the third designated public key address; (B) to the fifth contract address; and (C) including a second message including a request to burn a fifth amount of digital asset tokens from a balance associated with the third designated public address; wherein the second transaction request is digitally signed by the third designated private key; wherein the fourth smart contract executes, via the plurality of geographically distributed computer systems in the peer-to-peer network, the second transaction request to execute, via the plurality of geographically distributed computer systems in the peer-to-peer network, a sixth call request to the fifth contract address to obtain a sixth amount of digital asset tokens which reflect a current balance of digital asset tokens associated with the third designated public address; wherein, in response to the sixth call request, the fifth smart contract, executes via the plurality of geographically distributed computer systems in the peer-to-peer network, the seventh call request to return the sixth amount of digital asset tokens; wherein, in response to the return of the sixth amount of digital asset, the fourth smart contract executes, via the plurality of geographically distributed computer systems in the peer-to-peer network: (1) a balance verification instruction to confirm that the fifth amount of digital asset tokens is less than or equal to the sixth amount of digital asset tokens; and (2) in the case where the fifth amount of digital asset tokens is less than or equal to the sixth amount of digital asset tokens, execute, via the plurality of geographically distributed computer systems in the peer-to-peer network, a seventh call request to the fifth contract address to set a new balance for the digital asset tokens associated with the third designated public key address to a seventh amount which equals the sixth amount less the fifth amount; wherein, in response to the seventh call, the fifth smart contract executes, via the plurality of geographically distributed computer systems in the peer-to-peer network, the seventh call to set and store the new balance for the third designated public key address as the seventh amount and returns the new balance for the third designated public key address as the seventh amount; wherein, in response to the return of the new balance, the fourth smart contract executes, via the blockchain network, an eighth call request to the fifth contract address to obtain a total supply of digital asset tokens in circulation; wherein, in response to the eighth call request, the fifth smart contract executes, via the plurality of geographically distributed computer systems in the peer-to-peer network, the eighth call request and returns, to the fourth contract address, an eighth amount of digital asset tokens corresponding to the total supply of digital asset tokens in circulation; wherein, in response to the return of the eighth amount, the fourth smart contract, executes via the plurality of geographically distributed computer systems in the peer-to-peer network, a ninth call request to the fifth contract address to set a new total supply of digital asset tokens in circulation to a ninth amount, which is the eighth amount less the fifth amount; and wherein, in response to the ninth call request, the fifth smart contract, executes via the blockchain network, the ninth call request and sets a new total supply of digital asset tokens in circulation at the ninth amount, and returns to the fourth contract address.

In embodiments, the third designated key set is the first designated key set. In embodiments, the third designated key set is not the second designated key set. In embodiments, the third designated key set is the second designated key set. In embodiments, the third designated key set is not the first designated key set. In embodiments, the third computer system is the first computer system. In embodiments, the third computer system is not the first computer system. In embodiments, the administrator computer system includes the first computer system and the third computer system. In embodiments, the administrator computer system includes the first computer system and the second computer system.

In embodiments, the underlying digital asset is a stable value token. In embodiments, the underlying digital asset is NEO. In embodiments, the underlying digital asset is ETHER. In embodiments, the underlying digital asset is BITCOIN.

In embodiments, the first designated private key is mathematically related to a first designated public key.

In embodiments, wherein the first designated public address includes the first designated public key.

In embodiments, the first designated public address includes a hash of the first designated public key.

In embodiments, the first designated public address includes a partial hash of the first designated public key.

In embodiments, the second designated private key is mathematically related to a second designated public key.

In embodiments, the second designated public address includes the second designated public key.

In embodiments, the second designated public address includes a hash of the second designated public key.

In embodiments, the second designated public address includes a partial hash of the second designated public key.

In embodiments, the second smart contract instructions include sixth authorization instructions related to modifying a token supply of the digital asset token.

A method of increasing a total supply of digital asset tokens includes in accordance with an embodiment of the present application includes the steps of: (a) providing a first designated key pair, comprising a first designated public key of an underlying digital asset and a corresponding first designated private key, wherein the underlying digital asset is maintained on a distributed public transaction ledger maintained by a plurality of geographically distributed computer systems in a peer-to-peer network in the form of a blockchain, and wherein the first designated private key is stored on a first computer system which is connected to the distributed public transaction ledger through the Internet; (b) providing a second designated key pair, comprising a second designated public key of the underlying digital asset and a corresponding second designated private key, wherein the second designated private key is stored on a second computer system which is physically separated from the first computer system and is not operatively or physically connected to the distributed public transaction ledger or the Internet; (c) providing first smart contract instructions for a digital asset token associated with a first contract address associated with the blockchain associated with the underlying digital asset, wherein the first smart contract instructions are saved in the blockchain for the underlying digital assets and include: (1) first delegation instructions to delegate one or more first functions associated with the digital asset token to one or more delegated contract addresses associated with the blockchain associated with the underlying digital asset, wherein the one or more delegated contract addresses is different from the first contract address; (2) first authorization instructions for the second designated key pair; (d) providing second smart contract instructions for the digital asset token associated with a second contract address associated with the blockchain associated with the underlying digital asset, which is one of the one or more delegated contract addresses and not the first contract address, wherein the second smart contract instructions are saved in the blockchain for the underlying digital assets and include: (1) print limiter token creation instructions indicating conditions under which tokens of the digital asset token are created; (2) second authorization instructions for the first designated key pair with respect to token creation of the digital asset token; (3) third authorization instructions for a first designated custodian address with respect to token creation of the digital asset token; (e) providing third smart contract instructions for the digital asset token associated with a third contract address associated with the blockchain associated with the underlying digital asset, which is the first designated custodian contract address, wherein the third smart contract instructions are saved in the blockchain for the underlying digital assets and include: (1) fourth authorization instructions for the second designated key pair with respect to authorizing the issuance of instructions to the second smart contract regarding token creation; (f) providing fourth smart contract instructions for the digital asset token associated with a fourth contract address associated with the blockchain associated with the underlying digital asset, which is one of the one or more delegated contract addresses and not the first contract address, second contract address or third contract address, wherein the fourth smart contract instructions are saved in the blockchain for the underlying digital assets and include: (1) token creation instructions to create tokens of the digital asset tokens under conditions set forth by the print limiter token creation instructions; (2) second delegation instructions for delegating to another contract address, data storage operations; (g) providing fifth smart contract instructions for the digital asset token associated with a fifth contract address associated with the blockchain associated with the underlying digital asset, which is one of the one or more designated store contract addresses, wherein the fifth smart contract instructions are saved in the blockchain for the underlying digital assets and include: (1) data storage instructions for transaction data related to the digital asset token, wherein said transaction data comprises for all issued tokens of the digital asset token: (A) public address information associated with the underlying digital asset; and (B) corresponding token balance information associated with said public address information; (2) fifth authorization instructions for modifying the transaction data in response to a request from the fourth contract address; (h) increasing the total supply of the digital asset token, by a digital asset token issuer system, from a first amount of the digital asset tokens to a second amount of the digital asset tokens, comprising the steps of: (1) generating, by the digital asset token issuer system, a first transaction request including a first message comprising a first request to increase the total supply of the digital asset token to a second amount of digital asset tokens, from the on-line public key address to the fourth contract address, wherein the first transaction request is digitally signed by the first on-line private key; (2) sending, by the digital asset token issuer system via the underlying blockchain, the first transaction request from the on-line public key address to the fourth contract address; (3) sending, by the digital asset token issuer system via the underlying blockchain, the first transaction request from the fourth contract address to the second contract address; wherein the second smart contract executes, via the blockchain network, the first transaction request to return a first unique lock identifier associated with the first transaction request; (4) obtaining, by the digital asset token issuer system, the first unique lock identifier, based on reference to the blockchain; (5) generating, by the digital asset token issuer system, a second transaction request including a second message comprising a second request to unlock the total supply of the digital asset token in accordance with the first request and including the first unique lock identifier, the second transaction request being from the on-line public key address to the third contract address, wherein the second transaction request is digitally signed by the first on-line private key; (6) sending, by the digital asset token issuer system via the underlying blockchain, the second transaction request from the on-line public key address to the third contract address; wherein the third smart contract executes, via the blockchain network, the second transaction request to return a first unique request hash associated with the second transaction request; (7) obtaining, by the digital asset token issuer system, the first unique request hash, based on reference to the blockchain; (8) generating, by the digital asset token issuer system, a third transaction request to be digitally signed by at least the second designated private key including the first unique request hash; (9) transferring, from the digital asset token issuer system to a first portable memory device, the third transaction request; (10) transferring, from the first portable memory device to the second computer system, the third transaction request; (11) digitally signing, by the second computer system, the third transaction request using the second designated private key to generate a third digitally signed transaction request; (12) sending, from the second portable memory device using the digital asset token issuer system, via the underlying blockchain, the third digitally signed transaction request to the third contract address; and (i) confirming, by the digital asset token issuer system, that the total supply of digital asset tokens is set to the second amount of digital asset tokens based on reference to the blockchain; wherein the third smart contract, executes, via the blockchain network, the third digitally signed transaction request to validate the second request to unlock based on the third digitally signed transaction request and the first unique request hash and executes a first call to the second contract address, to increase the total supply of the digital asset token to the second amount of digital asset tokens, wherein the second contract address returns the first call to the fourth contract address and the fourth smart contract executes, via the blockchain network, a second call to the fifth contract address to set the total supply of the digital asset tokens to the second amount of digital asset tokens, wherein the fifth smart contract executes, via the blockchain, the second call to set the total supply of the digital asset tokens to the second amount of digital asset tokens.

In embodiments, the first designated key pair includes an additional designated key pair comprising an additional designated public key and an additional designated private key.

In embodiments, the second computer system is a hardware storage module.

In embodiments, the second designated key pair comprises an additional designated key pair comprising an additional designated public key and an additional designated private key.

In embodiments, the second authorization instructions for the first designated key pair with respect to token creation of the digital asset token includes instructions limiting creation of digital asset tokens above a first threshold amount over a first period of time.

In embodiments, the fourth authorization instructions for the second designated key pair to authorize the issuance of instructions to the second smart contract instructions with respect to token creation includes instructions to permit creation of digital asset tokens above the first threshold during the first period of time.

In embodiments, the third smart contract instructions further include: (2) sixth authorization instructions for the second designated key pair to authorize the issuance of instructions, to the first smart contract, to change the one or more designated contract addresses from the second contract address to a different designated contract address.

In embodiments, the fourth smart contract instructions further include: (3) token transfer instructions related to transferring tokens of the digital asset token from a first designated contract address to a second designated contract address.

In embodiments, the fourth smart contract instructions further include: (3) token destruction instructions related to destroying one or more tokens of the digital asset token.

In embodiments, the second smart contract instructions further include: (4) token balance modification instructions related to modifying a total number of tokens of the digital asset token assigned to a third designated address.

In embodiments, the fourth smart contract instructions further include: (3) token transfer instructions related to transferring tokens of the digital asset token from a first designated contract address to a second designated contract address; and (4) token destruction instructions related to destroying one or more tokens of the digital asset token.

In embodiments, the first transaction request includes first transaction fee information for miners in the blockchain network to process the first transaction request.

In embodiments, the second transaction request includes second transaction fee information for miners in the blockchain network to process the second transaction request.

In embodiments, the first portable memory device includes the second portable memory device.

In embodiments, the second smart contract instructions include sixth authorization instructions related to modifying a token supply amount of the digital asset token.

A method of increasing a total supply of digital asset tokens in accordance with an embodiment of the present application includes the steps of: (a) providing a first designated key pair, comprising a first designated public key of an underlying digital asset and a corresponding first designated private key, wherein the underlying digital asset is maintained on a distributed public transaction ledger maintained by a plurality of geographically distributed computer systems in a peer-to-peer network in the form of the blockchain, and wherein the first designated private key is stored on a first computer system which is connected to the distributed public transaction ledger through the Internet; (b) providing a second designated key pair, comprising a second designated public key of the underlying digital asset and a corresponding second designated private key, wherein the second designated private key is stored on a second computer system which is physically separated from the first computer system and is not operatively or physically connected to the distributed public transaction ledger or the Internet; (c) providing first smart contract instructions for a digital asset token associated with a first contract address associated with the blockchain associated with the underlying digital asset, wherein the first smart contract instructions are saved in the blockchain for the underlying digital assets and include: (1) first delegation instructions to delegate one or more first functions associated with the digital asset token to one or more delegated contract addresses associated with the blockchain associated with the underlying digital asset, wherein the one or more delegated contract addresses is different from the first contract address; and (2) first authorization instructions for the second designated key pair; (d) providing second smart contract instructions for the digital asset token associated with a second contract address associated with the blockchain associated with the underlying digital asset, which is one of the one or more delegated contract addresses and not the first contract address, wherein the second smart contract instructions are saved in the blockchain for the underlying digital assets and include: (1) print limiter token creation instructions indicating conditions under which tokens of the digital asset token are created; (2) first custodian address information instructions associated with a first designated custodian; and (3) second authorization instructions for the first designated key pair with respect to token creation of the digital asset token; (e) providing third smart contract instructions for the digital asset token associated with a third contract address associated with the blockchain associated with the underlying digital asset, which is the first designated custodian contract address, wherein the third smart contract instructions are saved in the blockchain for the underlying digital assets and include: (1) fourth authorization instructions for the second designated key pair with respect to issuance of instructions to the second smart contract regarding token creation; (f) providing fourth smart contract instructions for the digital asset token associated with a fourth contract address associated with the blockchain associated with the underlying digital asset, wherein the fourth smart contract instructions are saved in the blockchain for the underlying digital assets and include: (1) token creation instructions related to creating tokens of the digital asset token under the conditions set forth by the print limiter token creation instructions; and (2) second delegation instructions for delegating to one or more designated store contract addresses data storage functions; (g) providing fifth smart contract instructions for the digital asset token associated with a fifth contract address associated with the blockchain associated with the underlying digital asset, which is one of the one or more designated stored contract addresses, wherein the fifth smart contract instructions are saved in the blockchain for the underlying digital assets and include: (1) data storage instructions for transaction data related to the digital asset token, wherein said transaction data comprises for all issued tokens of the digital asset token: (A) public address information associated with the underlying digital asset; and (B) corresponding token balance information associated with said public address information; (2) third custodian instructions associated with a third designated custodian address corresponding to the fourth contracts address; and (3) fifth authorization instruction for modifying the transaction data in response to requests from the fourth contract address; (h) receiving, by the digital asset token issuer system, a request to generate and assign to a first designated public address a first amount of digital tokens; (i) generating, by a digital asset token issuer system, the first amount of digital asset tokens and assigning said first amount of digital asset token to the first designated public address increasing the total supply of the digital asset token, comprising the steps of: (1) generating, by the digital asset token issuer system, and sending, from the digital asset token issuer system via the underlying blockchain, a first transaction request: (A) from the on-line public key address; (B) to the fourth contract address; and (C) including a first message comprising a first request to generate the first amount of digital asset token and assign said first amount of digital asset tokens to the first designated public address; wherein the first transaction request is digitally signed by the first on-line private key; wherein the fourth smart contract executes, via the blockchain network, the first transaction request to: (i) validate the first request and the authority of the first on-line private key to call the second smart contract to execute the first request; and (ii) send a first call to the fourth contract address to generate and assign to the first designated public address the first amount of digital asset tokens; wherein the fourth smart contract executes, via the blockchain network, the first call request to generate a first unique lock identifier, and return to the second smart contract address the first unique lock identifier; wherein, in response to the return of the first unique lock identifier, the second smart contract executes, via the blockchain network, a call to the fourth smart contract address to confirm the first call request with the first lock identifier; wherein, in response, the fourth smart contract executes, via the blockchain network, the first call to execute a second call to the fifth contract address to obtain the total supply of digital asset tokens in circulation; wherein, in response, the fifth smart contract executes, via the blockchain network, the second call and returns, to the fourth contract address, a second amount of digital asset tokens corresponding to the total supply of digital asset tokens in circulation; wherein, in response to the return of the second amount, the fourth smart contract, executes via the blockchain network, a third call request to the fifth contract address to set a new total supply of digital asset tokens in circulation to a third amount, which is the total of the first amount and the second amount; wherein, in response to the third call, the fifth smart contract, executes via the blockchain network, the third call and sets a new total supply of digital asset tokens in circulation at the third amount; wherein, the fourth smart contract executes, via the blockchain network, a fourth call to the fifth contract address to add the first amount of digital asset tokens to the balance associated with the first designated public address; wherein, in response the fifth smart contract executes, via the blockchain network, the fourth call to set the balance of digital asset tokens in the first designated public address at a fourth amount which includes the addition of the first amount to the previous balance; and (j) confirming, by the digital asset token issuer system, that the balance of digital asset tokens in the first designated public address is set to include the first amount of digital asset tokens based on reference to the blockchain.

In embodiments, the second computer system is a hardware storage module.

In embodiments, the second designated key pair comprises an additional designated key pair comprising an additional designated public key and an additional designated private key.

In embodiments, the second authorization instructions for the first designated key pair with respect to token creation of the digital asset token include instruction limiting token creation above a first threshold over a first period of time.

In embodiments, the fourth authorization instructions for the second designated key pair to authorize the issuance of instructions to the second smart contract instructions with respect to token creation include instructions to allow for creation of digital asset tokens above the first threshold during the first period of time.

In embodiments, the third smart contract instructions further include: (2) sixth authorization instructions for the second designated key pair to authorize the issuance of instructions to the first smart contract to change the one or more designated contract addresses from the second contract address to a different designated contract address.

In embodiments, the fourth smart contract instructions further include: (3) token transfer instructions related to transferring tokens of the digital asset token from a first designated contract address to a second designated contract address.

In embodiments, the fourth smart contract instructions further include: (3) token destruction instructions related to destroying one or more digital asset token.

In embodiments, the fourth smart contract instructions further include: (3) token balance modification instructions related to modifying a total number of tokens of the digital asset token assigned to a third designated address.

In embodiments, the fourth smart contract instructions further include: (3) token transfer instructions related to transferring tokens of the digital asset token from a first designated contract address to a second designated contract address; and (4) token destruction instructions related to destroying one or more tokens of the digital asset token.

In embodiments, the method further comprises receiving, prior to generating the first amount of digital asset tokens, a validating request.

In embodiments, the method further comprises determining the first designated key pair has authority to process the request to generate the first amount of digital tokens.

In embodiments, the first transaction request includes first transaction fee information for miners in the blockchain network to process the first transaction request.

In embodiments, the fifth contract returns the balance of digital asset tokens to the fourth smart contract address.

In embodiments, the fifth contract returns the balance of digital asset tokens to the second smart contract address.

In embodiments, the method further comprises the steps of: (k) receiving, by the blockchain network, from a first user device associated with the first designated public address, via the underlying blockchain, a second transaction request: (A) from the first designated public address; (B) to the first contract address; and (C) including a second message comprising a second request to transfer a fifth amount of digital assets from the first designated public address to a second designated public address; wherein the first transaction request is digitally signed by a first private key, which is mathematically related to the first designated public address, and wherein the first user device had access to the first private key prior to sending the second transaction request; and wherein the first smart contract executes, via the blockchain network, the second transaction request to execute, via the blockchain network, a sixth call request to fourth contract address to transfer a fifth amount of digital assets from the first designated public address to the second designated public address; wherein, in response to the sixth call request, the fourth smart contract, executes via the blockchain network, sixth authorization instructions to verify the sixth call came from an authorized contract address, and upon verification, to execute a seventh call request to the fifth contract address to obtain a sixth amount of digital asset tokens which reflect a current balance of digital asset tokens associated with the first designated public address; wherein, in response to the seventh call request, the fifth smart contract, executes via the blockchain network, the seventh call request to return the sixth amount of digital asset tokens; wherein, in response to the return of the sixth amount of digital asset, the fourth smart contract executes, via the blockchain network: (1) a balance verification instruction to confirm that the fifth amount of digital asset tokens is less than or equal to the sixth amount of digital asset tokens, and (2) in the case where the fifth amount of digital asset tokens is less than or equal to the sixth amount of digital asset tokens, execute, via the blockchain network, a seventh call request to the fifth contract address to set a new balance for the digital asset tokens in the first designated public address to a seventh amount which equals the sixth amount less the fifth amount; wherein, in response to the seventh call, the fifth smart contract executes, via the blockchain network, the seventh call to set and store the new balance for the first designated public address as the seventh amount and returns a new balance for the first designated public address as the seventh amount; wherein, in response to the return of the new balance, the fourth smart contract executes, via the blockchain network, an eighth call to add the second amount of digital asset tokens to the balance associated with the second designated public address; wherein, in response to the eighth call request, the fifth smart contract executes, via the blockchain network, the eighth call request to set the balance of digital asset tokens in the second designated public address at a seventh amount which includes the addition of the second amount to a previous balance associated with the second designated public address; and wherein the first user device confirms that the balance of digital asset tokens in the first designated public address is the sixth amount of digital asset tokens based on reference to the blockchain.

In embodiments, the second transaction request includes second transaction fee information for miners in the blockchain network to process the second transaction request.

In embodiments, the balance of digital asset tokens in the second designated public address is returned to the fourth contract address.

In embodiments, the balance of digital asset tokens in the second public address is returned to the first smart contract address.

In embodiments, a second user device confirms that the balance of the digital asset tokens in the second designated public address is the seventh amount of digital asset tokens based on reference to the blockchain.

In embodiments, the method further includes the steps of: (k) providing a third designated key pair, comprising a third designated public key of the underlying digital asset and a corresponding third designated private key, and wherein the third designated private key is stored on a third computer system which is connected to the distributed public transaction ledger through the Internet; (l) receiving, by the blockchain network, from the third computer system, via the underlying blockchain, a second transaction request: (A) from the third designated public key address; (B) to the fifth contract address; and (C) including a second message comprising a request to burn a fifth amount of digital asset tokens from a balance associated with the third designated public key address; wherein the second transaction request is digitally signed by a third designated private key; wherein the fourth smart contract executes, via the blockchain network, the second transaction request to execute, via the blockchain network, a sixth call request to the fifth contract address to obtain a sixth amount of digital asset tokens which reflect a current balance of digital asset tokens associated with the third designated public key address; wherein, in response to the sixth call request, the fifth smart contract, executes via the blockchain network, the seventh call request to return the sixth amount of digital asset tokens; wherein, in response to the return of the sixth amount of digital asset, the fourth smart contract executes, via the blockchain network: (1) a balance verification instruction to confirm that the fifth amount of digital asset tokens is less than or equal to the sixth amount of digital asset tokens; and (2) in the case where the fifth amount of digital asset tokens is less than or equal to the sixth amount of digital asset tokens, execute, via the blockchain network, a seventh call request to the fifth contract address to set a new balance for the digital asset tokens in the third designated public key address to a seventh amount which equals the sixth amount less the fifth amount; wherein, in response to the seventh call, the fifth smart contract executes, via the blockchain network, the seventh call to set and store the new balance for the third designated public key address as the seventh amount and returns the new balance for the third designated public key address as the seventh amount; wherein, in response to the return of the new balance, the fourth smart contract executes, via the blockchain network, an eighth call request to the fifth contract address to obtain a total supply of digital asset tokens in circulation; wherein, in response to the eighth call request, the fifth smart contract executes, via the blockchain network, the eighth call request and returns, to the fourth contract address, an eighth amount of digital asset tokens corresponding to the total supply of digital asset tokens in circulation; wherein, in response to the return of the eighth amount, the fourth smart contract, executes via the blockchain network, a ninth call request to the fifth contract address to set a new total supply of digital asset tokens in circulation to a ninth amount, which is the eighth amount less the fifth amount; and wherein, in response to the ninth call request, the fifth smart contract, executes via the blockchain network, the ninth call request and sets a new total supply of digital asset tokens in circulation at the ninth amount, and returns to the fourth contract address.

In embodiments, the third designated key pair is the first designated key pair.

In embodiments, the third designated key pair is not the second designated key pair.

In embodiments, the third designated key pair is the second designated key pair.

In embodiments, the third designated key pair is not the first designated key pair.

In embodiments, the third computer system is the first computer system.

In embodiments, the third computer system is not the first computer system.

In embodiments, the administrator computer system comprises the first computer system and the third computer system.

In embodiments, the administrator computer system comprises the first computer system and the second computer system.

In embodiments, the second smart contract instructions include sixth authorization instructions related to modifying a token supply of the digital asset token.

Holding Collateral in a Smart Contract on an Underlying Blockchain

Figure 24:
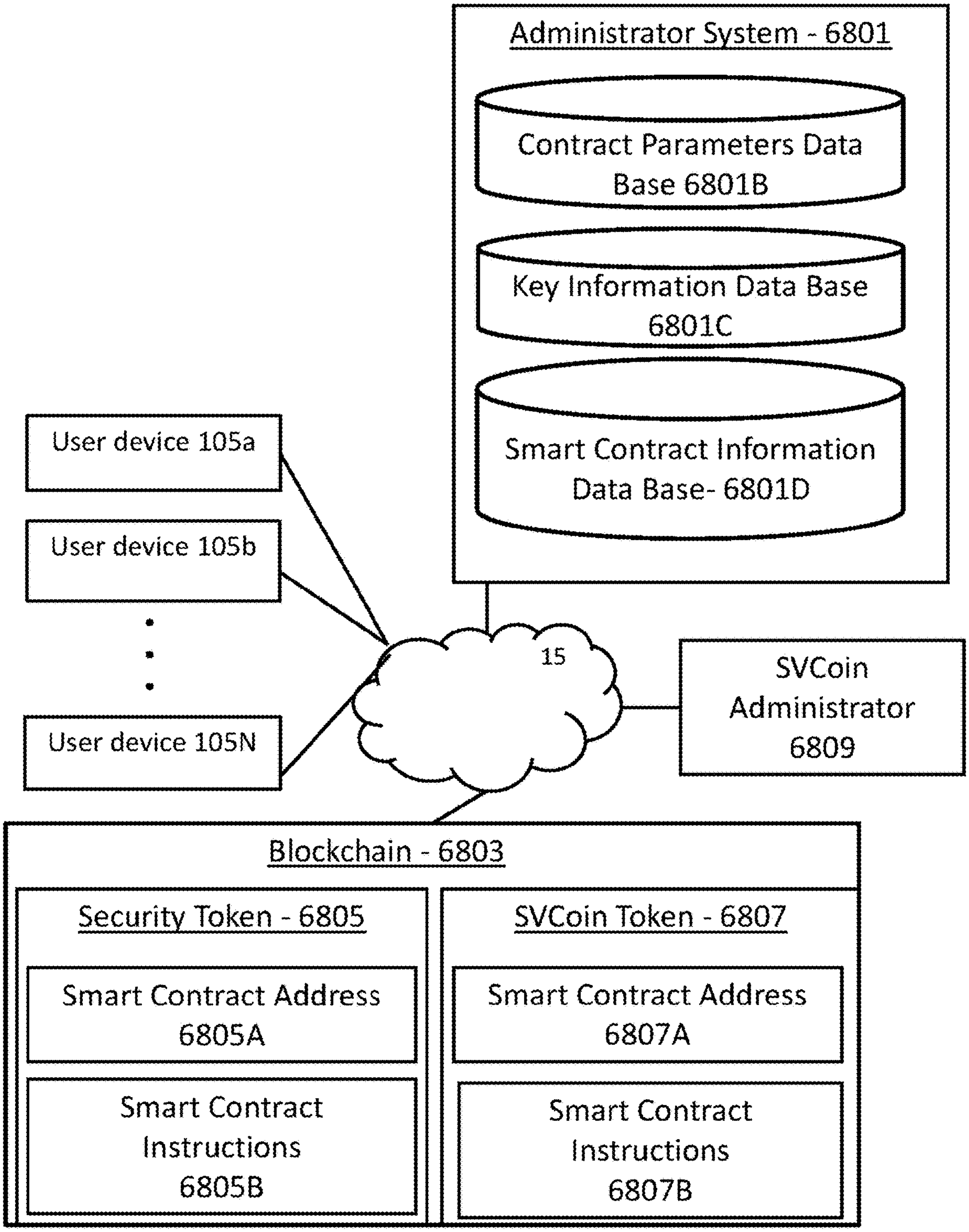
FIG. 24 is a schematic drawing of an exemplary network for holding collateral in a smart contract on an underlying blockchain in accordance with exemplary embodiments of the present invention.

FIG. 24 illustrates a schematic drawing of an exemplary network for holding collateral in a smart contract on an underlying blockchain in accordance with exemplary embodiments of the present invention. The network shown in FIG. 24 may include a security token administrator system 6801 associated with an issuer of a security token 6805 (Security Token), a stable value token administrator system 6809 associated with an issuer of a stable value token 6807 (SV Coin Token), and a plurality of end user devices 105*a*, 105*b*, . . . 105N, each associated one or more corresponding end users. In embodiments, more than one end user device may be associated with the same end user.

In embodiments, each of systems 6801, 8609 and user devices 105*a*, 105*b* . . . 105N may communicate with and/or among each other directly and/or indirectly, e.g., through a data network 15, such as the Internet. In embodiments, encryption and/or other security protocols may be used. In embodiments, data network 15, may be a wide area network, a local area network, a telephone network, dedicated access lines, a proprietary network, a satellite network, a wireless network, a mesh network, or through some other form of end-user to end-user interconnection, which may transmit data and/or other information. Any participants in a digital asset network may be connected directly or indirectly, as through the data network 15, through wired, wireless, or other connections.

In embodiments, issuer of the security token may be one or more entities. In embodiments, the issuer of the stable value token may be one or more entities. In embodiments, the issuer of the security token and the issuer of the stable value token may be the same or different entity. In embodiments, one or more administrators may operate the security token administrator system 6801 on behalf of the issuer of the stable value token. In embodiments, the same or different administrators may operate the stable value token administrator system 6809. In embodiments, the issuers and/or administrators may be a trust company, a regulated trust company, a bank, a broker dealer, or some other form of entity, to name a few.

In embodiments, the administrator system 6801 may access one or more databases stored on non-volatile computer readable memory including contract parameters data base 6801B, key information data 6801C and smart contract information 6801D. As further illustrated in FIG. 25A, in embodiments, contract parameters database 6801B may include at least the following smart contract terms or attributes: (1) inception date data 6902; (2) inception value data 6904; (3) benchmark data 6906; (4) contract duration data 6908; (5) collateral requirements data 6910; and (6) notional value data 6912, to name a few. In embodiments, other contract parameters may be stored in the contract parameters database. Additional databases, to name a few, are discussed above. Moreover, additional databases may include the databases discussed above in connection with the descriptions of Blockchain Financial Instruments, Digital Asset Exchanges, and Digital Wallets, to name a few. In embodiments, inception date data 6902 may refer to data that indicates dates at which smart contracts begin. In embodiments, inception value data 6904 may refer to data that indicates a value of smart contracts at a corresponding inception date. Benchmark data 6906 may refer to data that indicates benchmark information of which smart contracts are based off. In embodiments, contract duration data 6908 may refer to durations of smart contracts. In embodiments, collateral requirements data 6910 may refer to specific collateral requirements for smart contracts. In embodiments, notional value data 6912 may refer to the total amount of a security's underlying asset at its spot price in reference to smart contract values.

As illustrated in FIG. 24, the administrator system 6801, stable value administrator 6809, and/or user devices 105*a*, 105*b* and/or 105N may communicate with a blockchain network to access and/or add blocks to blockchain 6803. The blockchain 6803 may include one or more tokens, such as Security Token 6805 and SVCoin Token 6807 as illustrated. Each token will have at least one corresponding smart contract address (e.g., smart contract address 6805A for Security Token 6805, and smart contract address 6807A for SVCoin Token 6807, to name a few) by which instructions for each token may be accessed. In embodiments, the smart contract address may be associated with a proxy smart contract which may then issue calls to one or more other smart contracts having their own smart contract addresses.

Figure 25A:
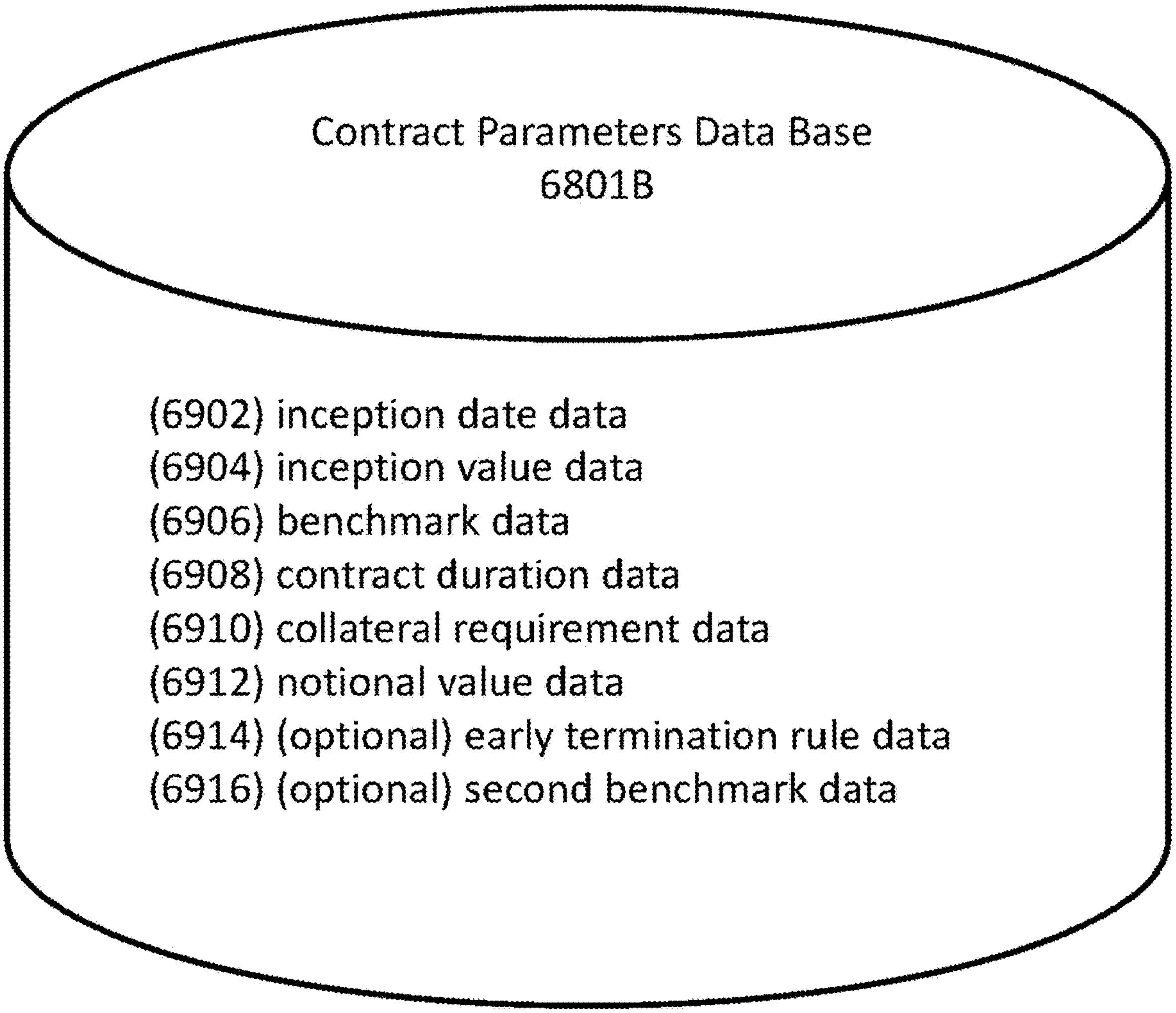
FIG. 25A is a schematic drawing of a contract parameters database of a smart contract in accordance with exemplary embodiments of the present invention.
Figure 25B:
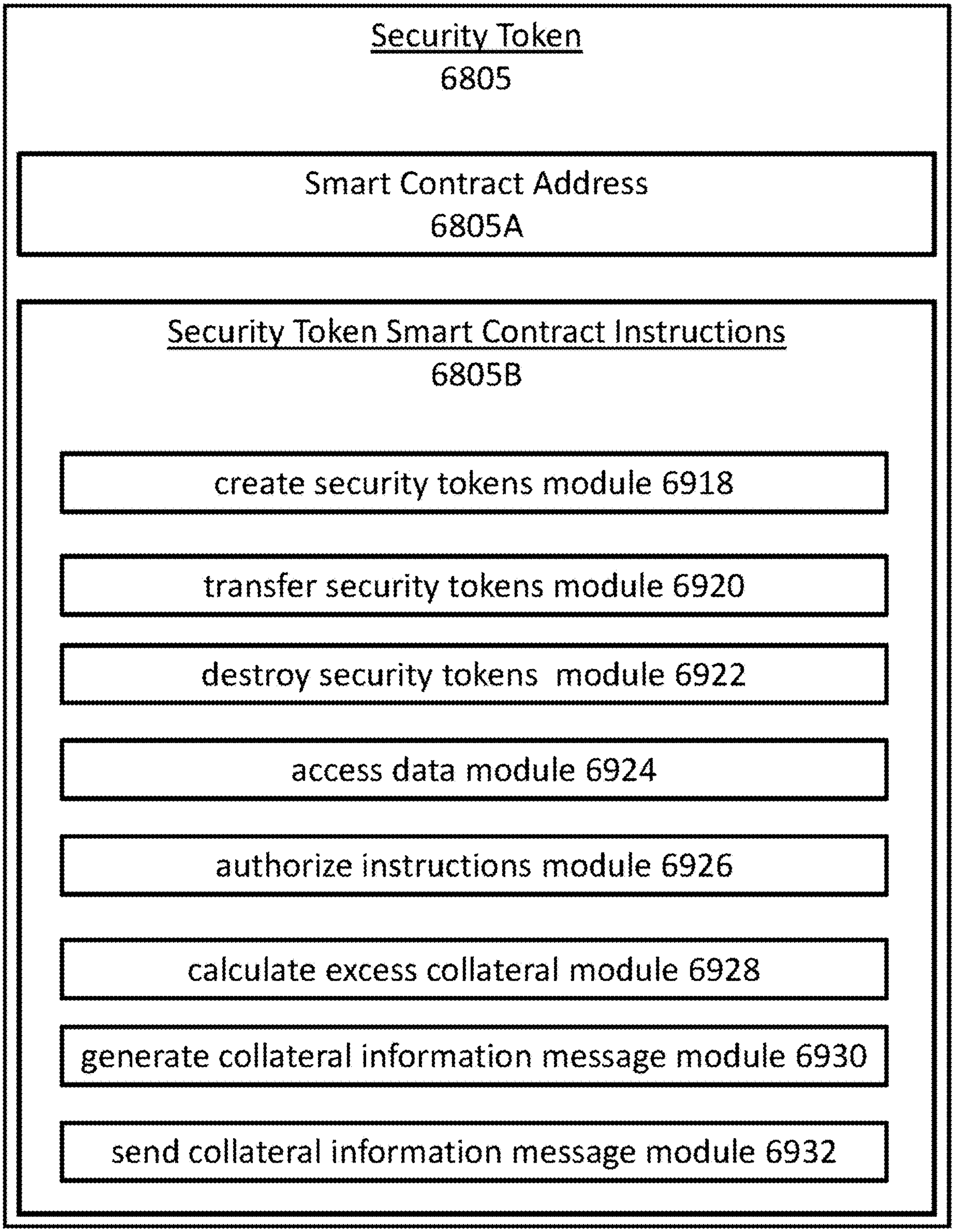
FIG. 25B is a schematic drawing of data structures associated with an exemplary security token on an underlying blockchain including smart contract instruction modules in accordance with exemplary embodiments of the present invention.

As illustrated in FIG. 25B, a security token smart contract 6805B is provided on the underlying blockchain 6803. Security token 6805 may also include a plurality of instruction modules that collectively make up the smart contract associated with the security token. By way of illustration, in embodiments, such modules may include modules of instructions such as: (1) a create security tokens module 6918; (2) a transfer tokens module 6920; (3) a destroy security tokens module 6922; (4) an access data module 6924; (5) an authorize instructions module 6926; (6) a calculate excess collateral module 6928; (7) a generate collateral information message module 6930; and (8) a send collateral information message module, to name a few.

In embodiments, the create security token module 6918 may include one or more authorization instructions related to creating security tokens. Such instructions may specify one or more authorized key pairs or contract addresses that may be authorized to create security tokens under specified conditions. In embodiments, the create security module 6918 may include instructions on increasing the token supply. In embodiments, the create security token module 6918 may include instructions on how to create new tokens within pre-approved token supply limits and how to assign newly created or "minted" tokens to specific designated public addresses or contract addresses on the underlying blockchain.

In embodiments, the transfer tokens module 6920, in embodiments, may include authorization instructions related to transferring security tokens. In embodiments, such transfer instructions may include rules by which certain transfer are allowed or blocked and may specify one or more key pair or contract addresses that may be authorized to perform one or more types of transfer operations. In embodiments, the transfer tokens module 6920 may include authorization instructions related to transferring stable value tokens to smart contract address 6805A. In embodiments, the transfer tokens module 6920 may include authorization instructions related to transferring stable value tokens from smart contract address 6805A.

In embodiments, the destroy security tokens module 6922 may include authorization instructions related to destroying security tokens, including, in embodiments, instructions on when, and with whose authority, security tokens associated with one or more specified addresses shall be destroyed or "burned", and thus removed from the security token supply.

The access data module 6924, in embodiments, may include authorization instructions related to accessing data supplied by a first authorized third party database (i.e., administrator system 6801), as discussed in further detail elsewhere.

The authorize instructions module 6926 may further include instructions to authorize the transfer of stable value tokens from the second contract address 6805B.

The generate collateral information message module 6930, in embodiments, may include instructions to generate a collateral confirmation message to the administrator system 6801 confirming receipt of at least one of a first amount of collateral and a second amount of collateral when at least one of the first amount of collateral and the second amount of collateral is received.

In embodiments, the send collateral information message module 6932 may include instructions to send the collateral confirmation message to the administrator system 6801 confirming receipt of at least one of a first amount of collateral and a second amount of collateral when at least one of the first amount of collateral and the second amount of collateral is received.

Figure 25C:
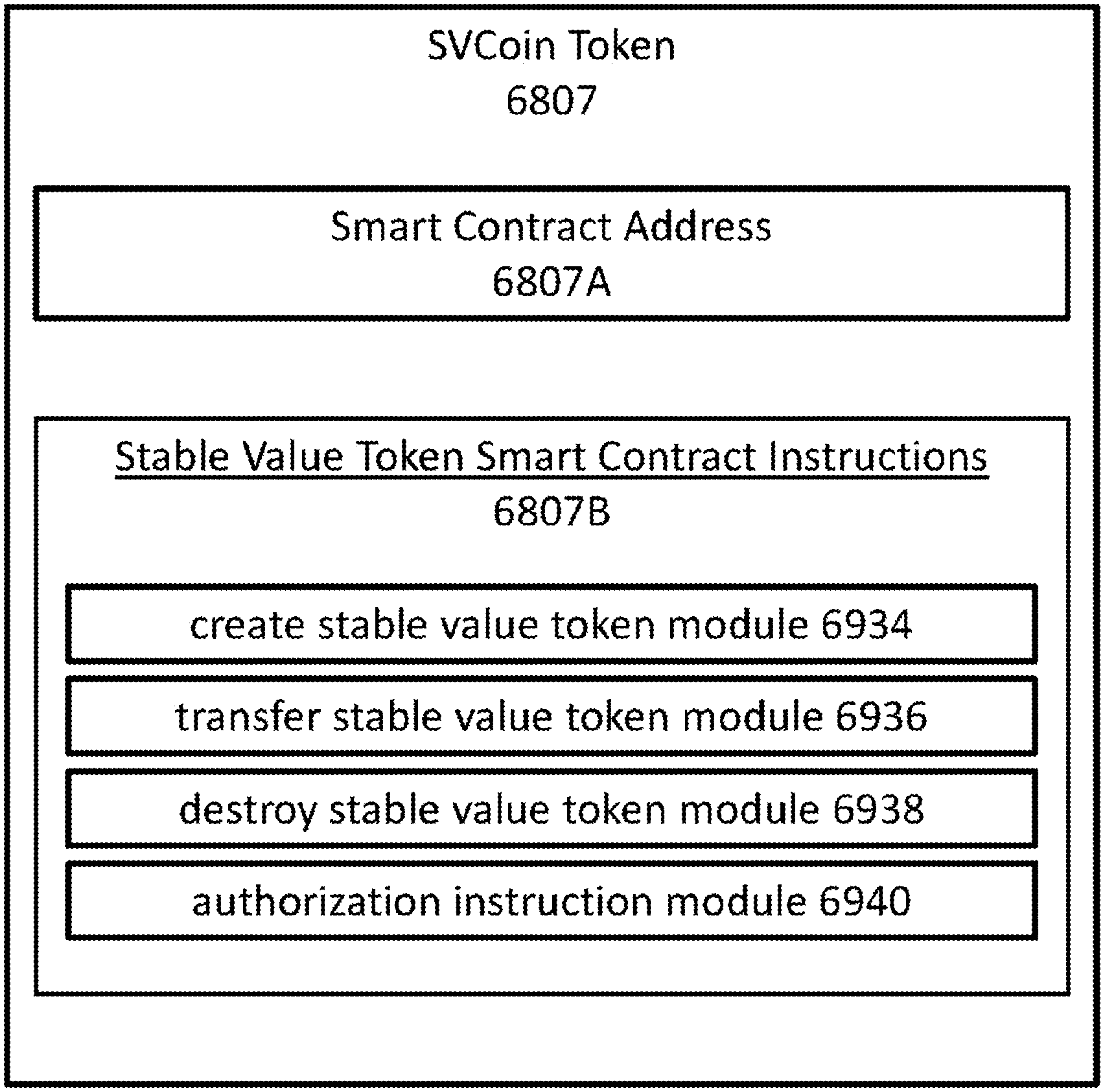
FIG. 25C is a schematic drawing of data structures associated with an exemplary stable value token (SVCoin Token) including smart contract instruction modules in accordance with exemplary embodiments of the present invention.

As illustrated in FIG. 25C, a stable value token smart contract 6807B is provided on the underlying blockchain 6803. Stable value token 6807 may also include a plurality of instruction modules that collectively make up the smart contract associated with the stable value token. By way of illustration, in embodiments, such modules may include modules of instructions such as: (1) a create stable value token module 6934; (2) a transfer stable value token module 6936; (3) a destroy stable value token module 6938; and (4) an authorization instruction module 6940.

In embodiments, the create stable value token module 6934 may include authorization instructions related to creating stable value tokens.

The transfer stable value token module 6936, in embodiments, may include authorization instructions related to transferring stable value tokens.

In embodiments, the destroy stable value token module 6938 may include authorization instructions related to destroying stable value tokens.

In embodiments, the authorization instruction module 6940 may include authorization instructions related to functions associated with the stable value tokens. In embodiments, authorization instructions module 6940 may also include instructions to authorize request received, the requests, in embodiments, being transaction requests from administrators, user public addresses, or other smart contracts.

While security token 6805 is described as a security token, in embodiments, the security token may reflect other types of tokens, such as tokens associated with a security, a bond, a financial instrument, a contract, and stock, to name a few. Similarly, while the SVCoin token 6807 is describe a stable value token, in embodiments, the SVCoin token 6807, may reflect other kinds of token which may not necessarily reflect a stable value, e.g., GAS tokens, and/or some other kind of token which the parties to the transaction reflect as an appropriate collateral.

Figure 28:
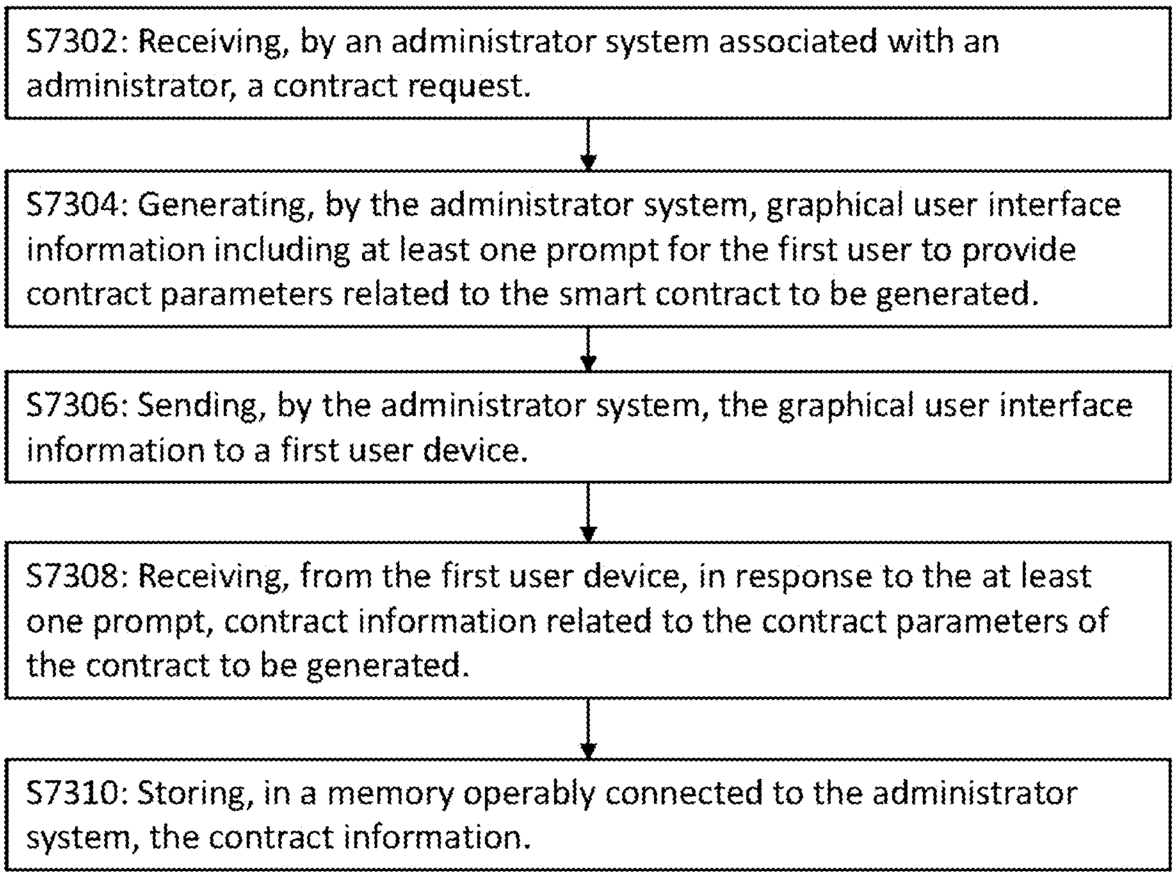
FIG. 28 is a flow chart of a processes for generating a smart contract on an underlying blockchain in accordance with exemplary embodiments of the present invention.

Referring to FIG. 28, an exemplary process for generating a smart contract in accordance with an embodiment of the present application is provided. In embodiments, the process shown in FIG. 28 may begin at a step S7302. In step S7302, an administrator system (i.e., administrator system 6801) may receive a contract request. In embodiments, the contract request may be received from a first user, and includes user identification information and a request to generate a smart contract. In embodiments, the first user may be an individual, associated with a first user device. In embodiments, the user identification information may be associated with the first user. In embodiments, the user identification information may be associated with a first user device. In embodiments, the first user may not be an individual, but may be an organization or entity such as a financial institution, exchange or brokerage house, to name a few. In embodiments, the first user device may be associated with a financial institution, exchange or brokerage house, to name a few. In embodiments, the first user device may be User device 105*a*. The contract request, in embodiments, may also include a smart contract generation request. The smart contract generation request, in embodiments, is a request from a user device, associated with a first user, to an administrator system to generate a smart contract.

In embodiments, a contract request may be from more than one user. In embodiments, a first user and second user may agree in advance, as to contract parameters, and one or the other may send a contract request that includes first user identification information associated with a first user device that is associated with a first user as well as second used identification information associated with a second user device that is associated with a second user. The first user device, in embodiments, may be User device 105*a*. In embodiments, the second user device may be User device 105*b*. The contract request, in embodiments, may include a smart contract generation request. The smart contract generation request, in embodiments, is a request from a user device to an administrator system to generate a smart contract.

In embodiments, the contract request may be for a contract where the parameters are already agreed upon by more than two users (i.e., User device 105*a*, User device 105*b*, . . . User device 105*n*). For example, where the contract parameters are already agreed upon by more than two users, the contract request may include user information for each of the users of which have already agreed upon the parameters of the requested contract. The contract request, in embodiments, may also include a smart contract generation request.

Once a contract request is received by the administrator system, at step S7304, the administrator system may generate graphical user interface (GUI) information including at least one prompt for the first user to provide contract parameters related to the smart contract to be generated. For example, the administrator system may generate graphical user interface information to provide a GUI similar to that shown in FIGS. 113A and B. In embodiments, the administrator system may also generate GUI information that prompts a user to input information corresponding to the contract parameters similar to or the same as the published contracts parameters described in connection with FIGS. 71A-71B (i.e., inception date 7104, inception value 7106, benchmark data 7108, contract duration data 7110, collateral requirement 7112, notional value 7114, early termination rules 7130, and second benchmark data 7132, to name a few) and the contract parameters of contract parameters data base 6801B described in connection with FIG. 69A, the descriptions of which applying herein. In embodiments, the administrator system may generate graphical user interface (GUI) information including at least one prompt for the second user to provide contract parameters related to the smart contract to be generated.

Once the GUI information is generated, at step S7306, the administrator system may send the GUI information to the first user device. In embodiments, once received by the first user device, the first user device may use the GUI information to display a GUI, which may be similar to GUI shown in connection with FIGS. 113A and 113B. In embodiments, such as embodiments where the contract parameters are already agreed upon by more than one user, the administrator system may send the GUI information to the first user device and the second user device. In embodiments, once received, the first and second user devices may each use the GUI information to display a GUI, which may be similar to GUI shown in connection with FIGS. 113A and 113B. In embodiments, such as embodiments where the parameters are already agreed upon by more than two users, the administrator system may send the GUI information to more than two user devices. In embodiments, once received, the more than two user devices may each use the GUI information to display a GUI, which may be similar to GUI shown in connection with FIGS. 113A and 113B.

In embodiments, once the GUI information is received by the first user device, the first user device may receive one or more inputs which may include contract information including the contract parameters. For example, the user device may receive inputs that indicate an inception date 7104, inception value 7106, benchmark data 7108, contract duration data 7110, collateral requirement 7112, notional value 7114, early termination rules 7130, and second benchmark data 7132, to name a few. In embodiments, where the GUI information is sent to more than one device, for example, where the GUI information is sent to a first user device and a second user device, at least one of the user devices may receive inputs which may include contract information including the contract parameters. The contract information including the contract parameters may, in embodiments, be sent from the first and or second user devices to the administrator system.

At a step S7308, the administrator system may receive, from the first user device, in response to the at least one prompt included in the graphical user interface information, contract information including the contract parameters of the contract to be generated. In embodiments, such as embodiments where the contract parameters are already agreed upon by more than one user, the administrator system may receive contract information including the contract parameters of the contract to be generated from at least one of the first user device and the second user device. In embodiments, such as embodiments where the parameters are already agreed upon by more than two users, the administrator system may receive contract information including the contract parameters of the contract to be generated from at least one of the user devices associated with the users that have already agreed upon the contract parameters.

Once the contract information is received by the administrator system, at a step S7310, the administrator system may store the contract information including the contract parameters in memory operably connected to the administrator system. In embodiments, the contract information may be stored in smart contract information database 6801D.

In embodiments, the contract parameters provided in the process described in connection with FIG. 28 may be used in arranging for multiple transactions based on the contract parameters. In embodiments, the contract parameters that are provided by the first user device, for example, may published to a plurality of user devices, in the same manner as is described below with respect to step S7002. In this case, users may indicate their desire to participate in the contract consistent with step S7004 discussed below.

The steps of the process described in connection with FIG. 28 may be rearranged or omitted.

In embodiments, the process of FIG. 28 may continue with the process in FIG. 26A. In alternative embodiments, FIG. 26A may be its own process, beginning with step S7002. Referring to FIG. 26A, in step S7002, an administrator system 6801 may publish (via, e.g., a public or private website or mobile application) a contract having contract parameters. Contract parameters, as described in step S7002 may be retrieved from contract parameters database 6801B. In embodiments, as shown in FIG. 25A, contract parameters database 6801B as discussed before. The published contract, in embodiments, may have a graphical user interface (GUI), including such information as shown in connection with FIG. 27A. The published contract may show some or all of the data described earlier in connection with FIG. 25A. For example, as shown in FIG. 27A, the published contract 7102 may have (1) an inception date 7104 of Jul. 19, 2018; (2) an inception value 7106 of $10,000; (3) benchmark data 7108 from the S&P 500; (4) a contract duration 7110 of 5 days; (5) a collateral requirement 7112 of 100 Stable Value Coins; and (6) a notional value 7114 of $10,000. Other values and parameters may be included consistent with embodiments of the present invention. In embodiments, these other values and parameters may include information that may be used to determine the contract parameters discussed above, and/or other parameters including: (1) asset identification information; (2) a current (spot) price; (3) a type of derivative; (4) a side (buy/sell); (5) a call/put designation, (6) an expiration date or term, (7) a strike price; (8) pricing model information, and (10) volatility information, to name a few. In embodiments, user input of certain information may prompt requests for additional information. In one example, input of an identification of a particular type of derivative may require user identification of other information, such as upper or lower price limit, to name a few.

In embodiments, the type of derivative may be any one of: vanilla, fx hedge, flexi forward, knock out, knock in, double knockout, double knock in, no touch, one touch, double no touch, double one touch, digital, digital knockout, digital knockin, digital double knockout, digital double knockin, compound, sequential—kiko & kiki, koki—no sequential, digital sequential, average (Asian), fader, digital accrual, accrual, accumulator, accumulator KO, accumulator KI, cas, dcd vanilla, dcd knockout, dcd knockin, average forward, euro-american KO, target redemption forward, dual-strike tarf, kockin tarf, pivot tarf, variance swap, volatility swap and forward volatility agreement, to name a few.

In embodiments, the pricing model may be any one of: black-scholes, vanna-volga, heston, local vol, stoch-local vol, stochastic, to name a few.

In embodiments, the smart contract parameters database may further include: (7) early termination rule data 6914; and (8) second benchmark data 6916, to name a few. In embodiments, early termination rule data 6914 may include rules that charge a fee associated with a user terminating the smart contract before the contract duration is completed. Second benchmark data 6916 in some embodiments may be different than benchmark data 6906. The published contract, in embodiments, may include a GUI with such information as shown in connection with FIG. 27B. In embodiments, the published contract may show some or all of the data described earlier in connection with FIG. 25A. For example, as shown in FIG. 27B, the published contract 7116 may have (1) an inception date 7118 of Jul. 20, 2018; (2) an inception value 7120 of $1,000; (3) benchmark data 7122 from the S&P 500; (4) a contract duration 7124 of 2 days. (5) a collateral requirement 7126 of 10 Stable Value Coins; (6) a notional value 7128 of $1,000; (7) no early termination rules 7130; and (8) second benchmark data 7132 from Winkdex®. While there are no early termination rules shown in the published contract of FIG. 27B, early termination rules may include, for example, a fee for terminating the contract early. Other values and parameters may be included consistent with embodiments of the present invention.

Figure 71A:
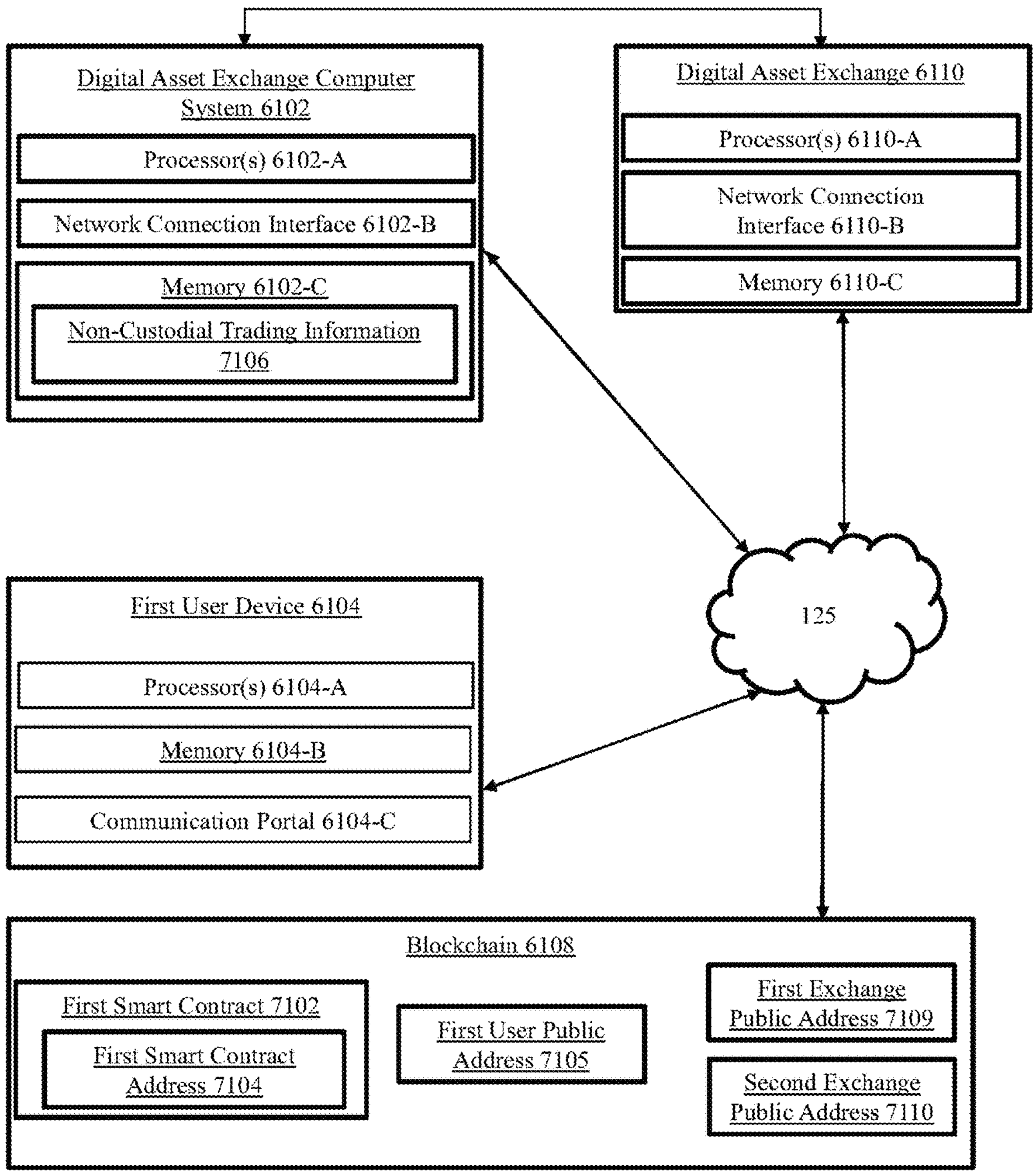
FIG. 71A is an exemplary block diagram illustrating a digital asset exchange computer system communicating with a first user device in accordance with exemplary embodiments of the present invention.

Referring to FIG. 26A, in step S7004, the administrator system 6801 may receive a plurality of indications of interest ("IOIs") or bids from users. Referring to FIGS. 27C-27F, the IOIs may include at least a first indication of interest (e.g., first indication of interest 7134 described in connection with FIG. 27C or first indication of interest 7140 described in connection with FIG. 27D) and a second indication of interest (e.g., second indication of interest 7150 described in connection with FIG. 27E or second indication of interest 7156 described in connection with FIG. 27F). In embodiments, the first indication of interest may be a first user response sent from a first user device 105*a* to administrator system 6801. In embodiments, the first user device 105*a* may be associated with a first user (e.g., Alice). In embodiments, as illustrated in FIGS. 71C and 71D, the first indication of interest 7134, 7140 may include at least first user identification information 7136, 7142 associated with the first user (e.g., a name, user number, email address, to name a few used to identify the indication of interest as coming from the first user (Alice)), and first side information 7138, 7144 (e.g., buy). First side information may include identification of a first leg of the smart contract (e.g., buy or sell). In embodiments, additional information, such as shown in FIG. 27D may also be included in an indication of interest. For example, referring to FIG. 27C, a first indication of interest 7134 may be sent by Alice (as the first user) to Gemini (as the security token administrator). Alice's indication of interest 7134 may include her user identification number 7136, ID No. 12345 (as the first user identification information), and information indicating that Alice would like to buy 7138 (as the first side information).

In embodiments, the first indication of interest may further include additional information such as, a first user public address and/or first collateral information, to name a few. In embodiments, such additional information may not be necessary to include in the indication of interest because it may be included in the contract parameters as published and thus implied. First collateral information may be in stable value digital asset tokens (SVCoins). For example, referring to FIG. 27D, a first indication of interest 7140 may be sent by Alice (as a first user) to Gemini (as the security token administrator). Alice's indication of interest may include: (1) her user identification number 7142, ID No. 12345 (as the first user identification information); (2) information indicating that Alice would like to buy 7144 (as the first side information); Alice's Public Address 7146 (as the a first user public address); and (4) information indicating a collateral 7148 of 100 Stable Value Coins (as the first collateral information).

In embodiments, the second indication of interest may be a second user response sent from a second user device 105*b* to administrator system 6801. In embodiments, the second user device 105*b* may be associated with a second user (e.g., Bob). The second indication of interest (e.g., second indication of interest 7150 described in connection with FIG. 27E or second indication of interest 7156 described in connection with FIG. 27F) may include second user identification information 7152, 7158 associated with the second user (e.g., a name, user number, email address, to name a few used to identify the indication of interest as coming from the second user (Bob), and second side information (e.g., sell). The second side information may include identification of a second leg of the smart contract (e.g., buy or sell). In embodiments, the second leg is different from the first leg. In embodiments, additional information, such as shown in FIG. 27F, may also be included in an indication of interest. For example, referring to FIG. 27E, a second indication of interest 7150 may be sent by Bob (as the second user) to Gemini (as the security token administrator). Bob's indication of interest 7150 may include his user identification number 7152, ID No. 54321 (as the second user identification information), and information indicating 7154 that Bob would like to sell (as the first side information). In some embodiments, the second indication of interest my further include additional information such as, a second user public address 7162 and/or second collateral information 7164, to name a few. The second collateral information 7164 may be in stable value digital asset tokens ("SVCoins"). In embodiments, the second indication of interest may include the second user's digital signature which is based on their private key which corresponds to their public key which is associated with their public address. For example, referring to FIG. 27F, a second indication of interest 7156 may be sent by Bob (as the second user) to Gemini (as the security token administrator). Bob's indication of interest 7156 may include: (1) his user identification number 7158, ID No. 54321 (as the second user identification information) or Alice's digital signature which is based on her private key which corresponds to her public key which is associated with her Public Address; (2) information indicating that Bob would like to sell 7160 (as the second side information); Bob's Public Address 7162 (as the second user public address); and (4) information indicating a collateral 7164 of 100 Stable Value Coins (as the second collateral information). In embodiments, Bob's indication of interest may include the Bob's digital signature which is based on Bob's private key which corresponds to Bob's public key which is associated with Bob's Public Address.

In embodiments, step S7004 may further include the administrator system may receive a third and fourth user responses from a fourth user device and a fifth user device, for example. The third user response, in some embodiments, may include fourth user identification information associated with the fourth user. In embodiments, the third user response may also include third side information comprising identification of the first leg of the contract. In embodiments, the third user response may be similar to first indication of interest 7134 described in connection with FIG. 27C, first indication of interest 7140 described in connection with FIG. 27D, second indication of interest 7150 described in connection with FIG. 27E and/or second indication of interest 7156 described in connection with FIG. 27F, the descriptions of which applying herein.

The fourth user response may include fifth user identification information associated with the fifth user. In embodiments, the fourth user response may also include fourth side information comprising identification of the second leg of the contract, the fourth side information being different than the third side information. In embodiments, the fourth user response may be similar to first indication of interest 7134 described in connection with FIG. 27C, first indication of interest 7140 described in connection with FIG. 27D, second indication of interest 7150 described in connection with FIG. 27E and/or second indication of interest 7156 described in connection with FIG. 27F, the descriptions of which applying herein.

Referring back to FIG. 26A, after receiving the first user response (i.e., a first indication of interest) and the second user response (i.e., a second indication of interest), in step S7006, the administrator system 6801 matches the first user response with the second user response. For example, referring to FIGS. 27C-27F, administrator 6801 may match Alice with Bob because Alice wants to buy and Bob would like to sell. In embodiments, such as embodiments where more than one user has agreed to the contract provisions in the published contract (as discussed above in connection with FIG. 28), matching may not be required and step S7006 may be omitted.

In embodiments, such as the embodiments where a third user response and fourth user response are received by the administrator system, the third user response may be matched with the fourth user response.

In step S7008, a stable value token smart contract associated with a stable token 6807 and first smart contract instructions 6807B associated with a first contract address 6807A associated with the blockchain 6803 for the underlying digital asset are provided. In embodiments, the first smart contract instructions 6807B are saved in the blockchain 6803 for the underlying digital asset. In embodiments, the first smart contract instructions 6807B may include the stable value token smart contract instructions 6807B described in connection with FIG. 25C, the same description applying herein.

Referring back to FIG. 26A, in step S7010, a security token smart contract associated with a security token 6805 and second smart contract instructions 6805B associated with the blockchain 6803 for the underlying digital asset are provided. In embodiments, the second smart contract instructions 6805B are saved in the blockchain 6803 for the underlying digital asset. In embodiments, the second smart contract instructions 6805B may include the security token smart contract instructions 6805B described in connection with FIG. 25B, the same description applying herein.

In embodiments, step S7008 and step S7010 may be performed before step S7002, step S7004, and step S7006.

Referring back to FIG. 26A, the process may continue with step S7012, in which the administrator system 6801 sets up a first trade (e.g., trade001) between the first user (e.g., the user associated with first user device 105*a*) and the second user (e.g., the user associated with the second user device 105*b*) using the security token smart contract 6805B on the underlying blockchain 6803 with collateral in the form of stable value digital assets (i.e., stable value token 6807). Step S7012 is described in more detail in connection with FIGS. 70B-D.

Figure 26B:
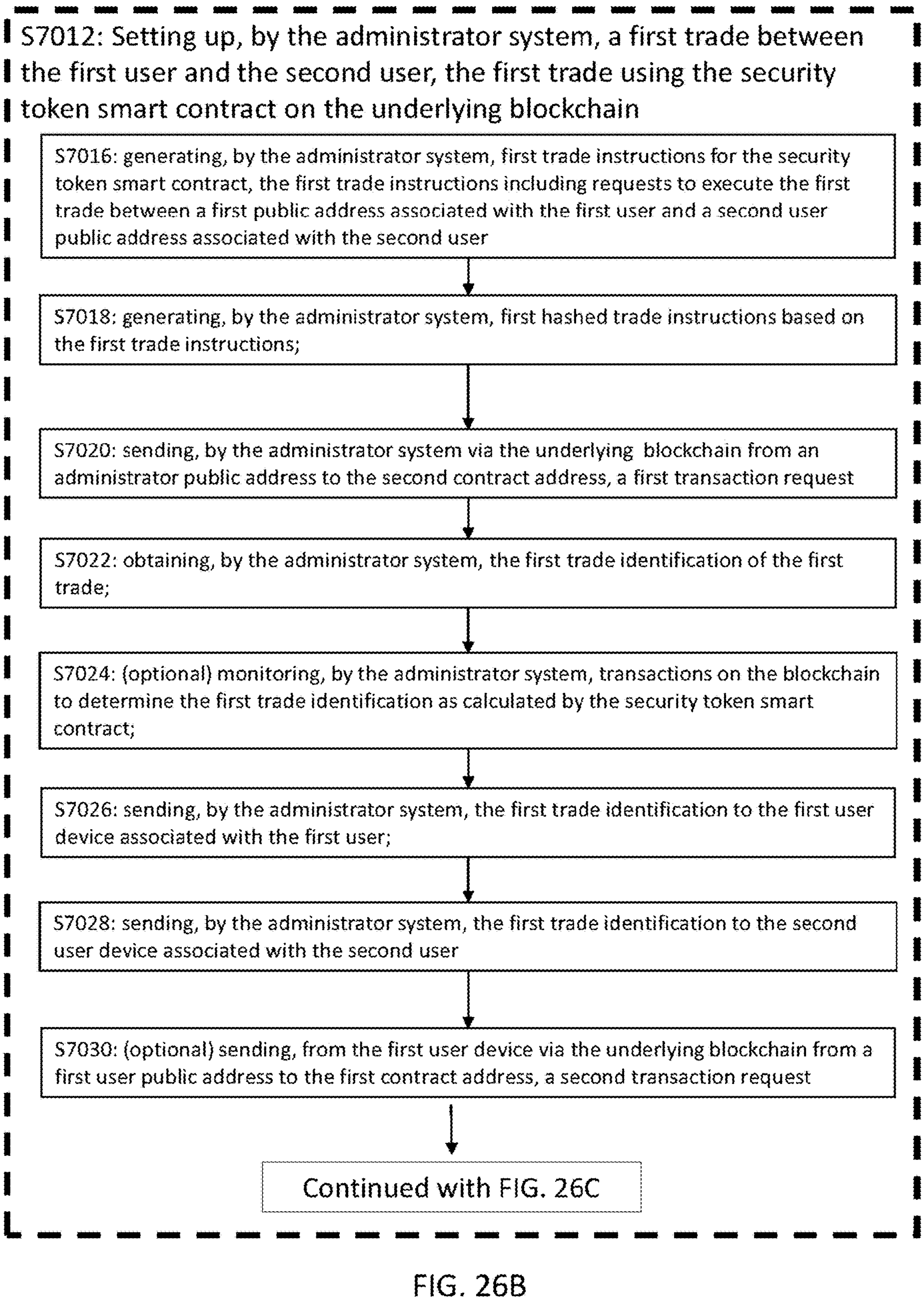
FIGS. 26B-26C are flowcharts of an exemplary subprocess of setting up a trade between a first user and a second user in accordance with exemplary embodiments of the present invention.

Referring to FIG. 26B, in embodiments, setting up the first trade between the first user and the second user may begin at step S7016, where the administrator system 6801 generates first trade instructions for the security token smart contract 6805B. The first trade instructions may include instructions to execute the first trade between a first user public address associated with the first user (e.g., the user associated with user device 105*a*) and a second user public address associated with a second user (e.g., the user associated with user device 105*b*). In embodiments, the first trade is based at least on the contract terms from step S7002 (i.e., one or more of the contract parameters discussed in connection with FIG. 25A), the first user response from step S7004 (associated with a received IOI—i.e., the IOI's described in connection with FIGS. 27C-27F), and the second user response from step S7004 (associated with another received IOI—i.e., the IOI's described in connection with FIGS. 27E-27F).

In step S7018, the administrator system 6801 may generate first hashed trade instructions, the first hashed trade instructions being generated by applying a hash algorithm to the first trade instructions. Examples of hash algorithms include MD 5, SHA 1, SHA 256, RIPEMD, and Keccak-256 to name a few. Hash algorithms take an input of any length and create an output of fixed length, allowing the trade instructions to be detectable and usable by administrators and users on the underlying blockchain. However, applying a hash algorithm is not always necessary if trade instructions are published ahead of time In step S7020, the administrator system 6801 sends a first transaction request from an administrator public address associated with the administrator system 6801 to the second contract address 6805A via the underlying blockchain 6803. In embodiments, the first transaction request, includes a first message which may include: (1) the first hashed trade instructions; (2) a request to assign a first trade identification to a first trade associated with the hashed trade instructions. In embodiments, the first message may include requests to assign a first trade identification to the first trade associated with the hashed trade instructions and include the first trade identification associated with the first hashed trade instructions. In embodiments, the first transaction request may further include first transaction fee information. The first transaction fee information, in embodiments, may be for miners on the blockchain 6803 to process the first transaction request. The first transaction request may also be electronically signed by an administrator private key. The administrator private key may be mathematically related to the administrator public address.

The process may continue with step S7022. In step S7022, the administrator system 6801 obtains the first trade identification of the first trade. In embodiments, the administrator system 6801 may determine the first trade identification, as calculated by the security token smart contract, by monitoring transactions on the blockchain 6803 (as shown in connection with a step S7024 of FIG. 26B). In response to obtaining the first trade identification of the first trade, the administrator system 6801 may notify the first user (e.g., the user associated with user device 105*a*) and the second user (e.g., the user associated with user device 105*b*) of the first trade identification. In step S7026, the administrator system 6801 may send the first trade identification to the first user device 105*a* associated with the first user. Similarly, in step S7028, the administrator system 6801 sends the first trade identification to the second user device 105*b* associated with the second user.

In embodiments, as shown in step S7030, the first user device 105*a* may send a second transaction request from a first user public address (the first user public address being associated with the first user and the first user device 105*a*) to the first contract address 6807A via the underlying blockchain 6803. The second transaction request may include a second message, the second message including requests to the stable value token smart contract 6807B regarding a first transfer of a first amount of collateral. In embodiments, the second message may include the first trade information. In embodiments, the second transaction request may include second transaction fee information. The second transaction fee information may be for miners on the blockchain 6803 to process the second transaction request. In embodiments, the second message may also include a transfer request to the stable value smart contract to transfer the first amount of collateral in the form of stable value digital asset tokens 6807 from the first user public address to the second contract address 6805A. The transfer request, in embodiments, will be executed upon receipt of a first collateral request from the second contract address 6805A. In embodiments, the transfer request included in the second message may be executed upon receipt of a first collateral request from the administrator system 6801. The second transaction request is also electronically signed by a first user private key. The first user private key may be mathematically related to the first user public address.

Figure 26C:
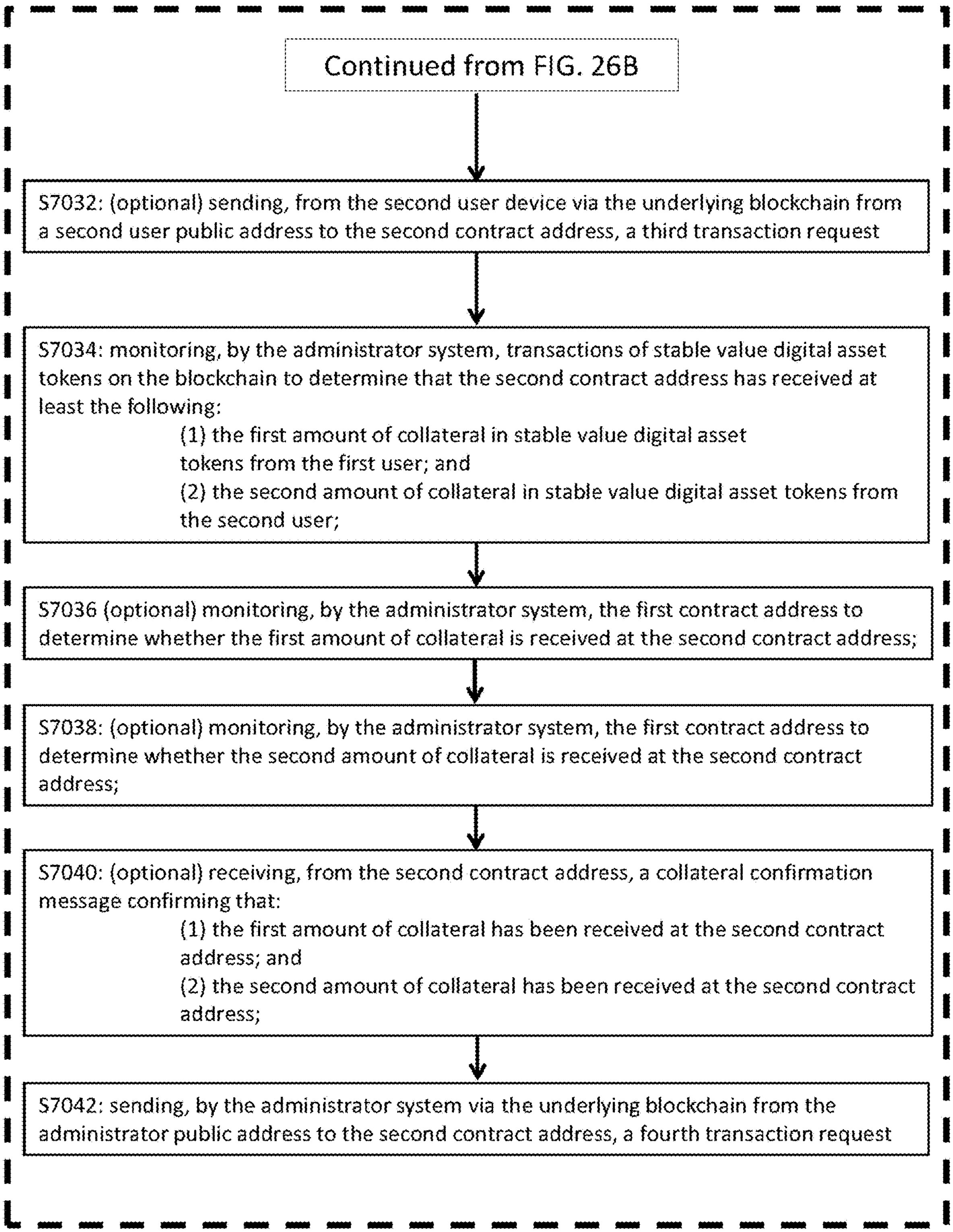

In embodiments, the process described in FIG. 26B may continue with the process shown in connection with FIG. 26C. In embodiments, as shown In step S7032, the second user device may send a third transaction request from a second user public address (associated with the second user and the second user device 105*b*) to the second contract address 6805A via the underlying blockchain 6803. The third transaction request may include a third message including a second transfer request to the stable value token smart contract 6807B regarding a second transfer of the second amount of collateral from the second user public address to the second contract address 6807A. In embodiments, the third transaction request may further include third transaction fee information. The third transaction fee information, in embodiments, may be for miners on the blockchain 6803 to process the third transaction request. The second transfer request of the third message, in embodiments, will be executed upon receipt of a second collateral request from the second contract address 6805A. Alternatively, the second transfer request of the third message will be executed upon receipt of a second collateral request from the administrator system 6801. The third transaction request may also be electronically signed by a second user private key. The second user private key may be mathematically related to the second user public address.

The process may continue with a step S70121. In step S7034, the administrator system 6801 monitors transactions of the stable value digital asset tokens 6807 on the blockchain 6803 to determine that the second contract address 6805A has received at least the following: (1) the first amount of collateral in stable value digital asset tokens from the first user (e.g., the user associated with user device 105*a*); and (2) the second amount of collateral in stable value digital asset tokens from the second user (e.g., the user associated with user device 105*b*). In embodiments, the administrator system 6801 may further monitor the first contract address 6807A to determine whether the first amount of collateral is received at the second contract address 6805A and whether the second amount of collateral is received at the second contract address 6805A (as shown in connection with a step S7036 of FIG. 26C and step S7038 of FIG. 26C).

Alternatively, the administrator system 6801 may receive a collateral confirmation message confirming that the first amount of collateral and the second amount of collateral are received by the second contract address 6805A (as shown in connection with a step S7040 of FIG. 26C). In embodiments, either the first amount of collateral, the second amount of collateral, or both may not be received at the second contract address. If either or both are not received, in embodiments, the collateral confirmation message may indicate a lack of collateral, or the collateral confirmation message may not be sent.

Upon determining that the first amount of collateral from the first user (e.g., the user associated with user device 105*a*) and the second amount of collateral from the second user (e.g., the user associated with user device 105*b*) have both been received by the second contract address 6805A, in step S7042, the administrator system 6801 may send a fourth transaction request from the administrator public address to the second contract address 6805A via the underlying blockchain 6803. The fourth transaction request may include a fourth message including the first trade instructions and the first trade identification. In embodiments, the fourth transaction request may further include fourth transaction fee information. The fourth transaction fee information, in embodiments, may be for miners on the blockchain 6803 to process the fourth transaction request. The fourth transaction request may also be electronically signed by the administrator private key.

In embodiments, the second contract address 6805A may further include modules with instructions to: (1) generate a first collateral request when the third message is received by the second contract address 6805A; (2) send the first collateral request to the first contract address 6807A associated with the stable value token smart contract; (3) generate a second collateral request when the third message is received by the first contract address 6807A; (4) send the first collateral request to the first contract address 6807A associated with the stable value digital asset token smart contract; confirming that the first amount of collateral from the first user (e.g., a user associated with user device 105*a*) and the second amount of collateral from the second user (e.g., a user associated with user device 105*b*) has been received by the second contract address; and (5) sending a collateral confirmation message to the administrator public address.

Upon receiving the confirmation message, the administrator system 6801 may send a fourth transaction request from the administrator public address to the second contract address 6805A via the underlying blockchain 6803. The fourth transaction message may include a fourth message comprising first trade instructions and the first trade identification.

Figure 26D:
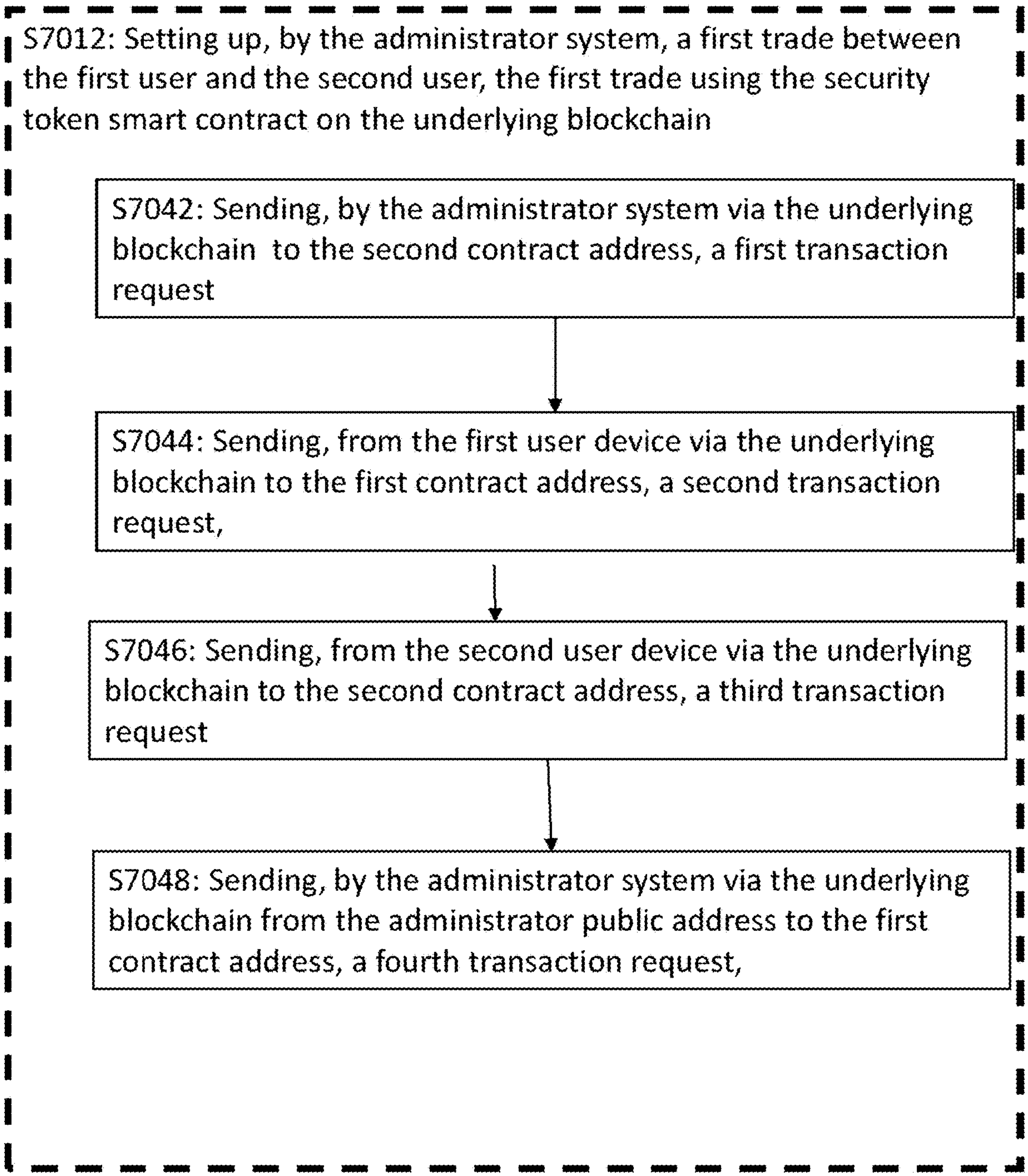
FIG. 26D. is a flowchart of another exemplary subprocess of setting up a trade between a first user and a second user in accordance with another exemplary embodiment of the present invention.

Referring now to FIG. 26D, in embodiments, step S7012 may being with a step S7042. In step S7042, the administrator system 6801 may send a first transaction request from the administrator public address to the second contract address 6805A via the underlying blockchain 6803. The first transaction request, in embodiments, may include a first message comprising requests to create a first trade between the first user and the second user in accordance with the security token smart contract 6805B. In embodiments, the first transaction request may further include first transaction fee information. The first transaction fee information, in embodiments, may be for miners on the blockchain 6803 to process the first transaction request. The first transaction request may also be electronically signed by the administrator private key. The administrator private key is mathematically related to the administrator public address.

In embodiments, as shown in step S7044, the first user device 105*a* may then send a second transaction request from a first user public address (the first user public address being associated with the first user and the first user device 105*a*) to the first contract address 6807A via the underlying blockchain 6803. The second transaction request may include a second message, the second message authorizing the stable value token smart contract 6807B to accept a request to transfer a first amount of collateral from the first user public address to the second contract address 6805A. In embodiments, the second transaction request may further include second transaction fee information. The second transaction fee information, in embodiments, may be for miners on the blockchain 6803 to process the second transaction request. The second transaction request may be electronically signed by the first user private key. The first user private key is mathematically related to the first user public address.

The process may continue at step S7046. At a step S7046, the second user device may send a third transaction request from a second user public address (associated with the second user and the second user device 105*b*) to the second contract address 6805A via the underlying blockchain 6803. The third transaction request may include a third message authorizing the stable value digital asset smart contract 6807B to accept a request to transfer a second amount of collateral from the second user public address to the second contract address 6805A. In embodiments, the third transaction request may further include third transaction fee information. The third transaction fee information, in embodiments, may be for miners on the blockchain 6803 to process the third transaction request. The third transaction request may be electronically signed by the second user private key. The second user private key is mathematically related to the second user public address.

In step S7048, the administrator system 6801 may send a fourth transaction request from the administrator public address to the first contract address 6807A via the underlying blockchain 6803. The fourth transaction request may include a fourth message including requests to: (1) transfer of the first amount of collateral of stable value digital asset tokens from the first user public address to the second contract address 6805A; and (2) transfer of a second amount of collateral of stable value digital asset tokens 6807 from the second user public address to the second contract address 6805A. The fourth transaction request may also be electronically signed by the administrator private key.

Alternatively, the second contract address 6805A may send a fourth transaction request to the first contract address 6807A via the underlying blockchain 6803. The fourth transaction request may similarly include a fourth message including requests to: (1) transfer of the first amount of collateral of stable value digital asset tokens 6807 from the first user public address to the second contract address 6805A; and (2) transfer of a second amount of collateral of stable value digital asset tokens from the second user public address to the second contract address 6805A.

In alternative embodiments, steps S7010 and S7012 (and accompanying sub steps described above in connection with FIGS. 70B-D) may be replaced by a method of generating the security token contract associated with the security token 6805 associated with blockchain 6803 for the underlying digital asset. The method, in embodiments, may begin by an administrator 6801 generating the security token smart contract associated with a security token 6805 and second smart contract instructions 6805B associated with a second smart contract address 6805A associated with the blockchain 6803 for the underlying digital asset. In embodiments, the second smart contract instructions 6805B are saved in the blockchain 6803 for the underlying digital asset.

The second smart contract instructions 6805B may include one or more of the following: (1) first trade instructions for the security token smart contract; (2) fifth authorization instructions regarding transferring security tokens (which may be included in the transfer security tokens module 6920); (3) sixth authorization instructions regarding destroying security tokens (which may be included in the destroy security tokens module 6922); (4) seventh authorization instructions regarding transferring stable value tokens to the second contract address (which may be included in the authorize instructions module 6926); (5) eighth authorization instructions regarding transferring stable value tokens from the second contract address (which may be included in the authorize instructions module 6926); (6) calculating instructions regarding calculating excess collateral (which may be included in the calculate excess collateral module 6928); (7) generating collateral information instructions regarding excess collateral (which may be included in the generate collateral information message module 6930); and (8) sending collateral information message instructions regarding excess collateral (which may be included in the send collateral information message module 6932). In embodiments, the first trade instructions may include execution instructions to execute a first trade between the first user and the second user. The first trade, in embodiments, may be based on at least (1) the contract request or proposal and (2) the first user response.

In embodiments, once the security token contract is generated by an administrator 6801, the administrator 6801 may send the security token smart contract and associated second smart contract instructions 6805B to the second smart contract address 6805A via the blockchain 6803 for the underlying digital asset.

In embodiments, the first trade instructions may be implemented via the blockchain 6803 for the underlying digital asset by computers systems among the plurality of geographically distributed computer systems in the peer-to-peer network.

Referring back to FIG. 26A, the process of FIG. 26A may continue with step S7014. In step S7014, excess collateral from the first trade may be collected from the security token contract. Step S7014 is described in more detail in connection with FIGS. 70E-F.

Figure 26E:
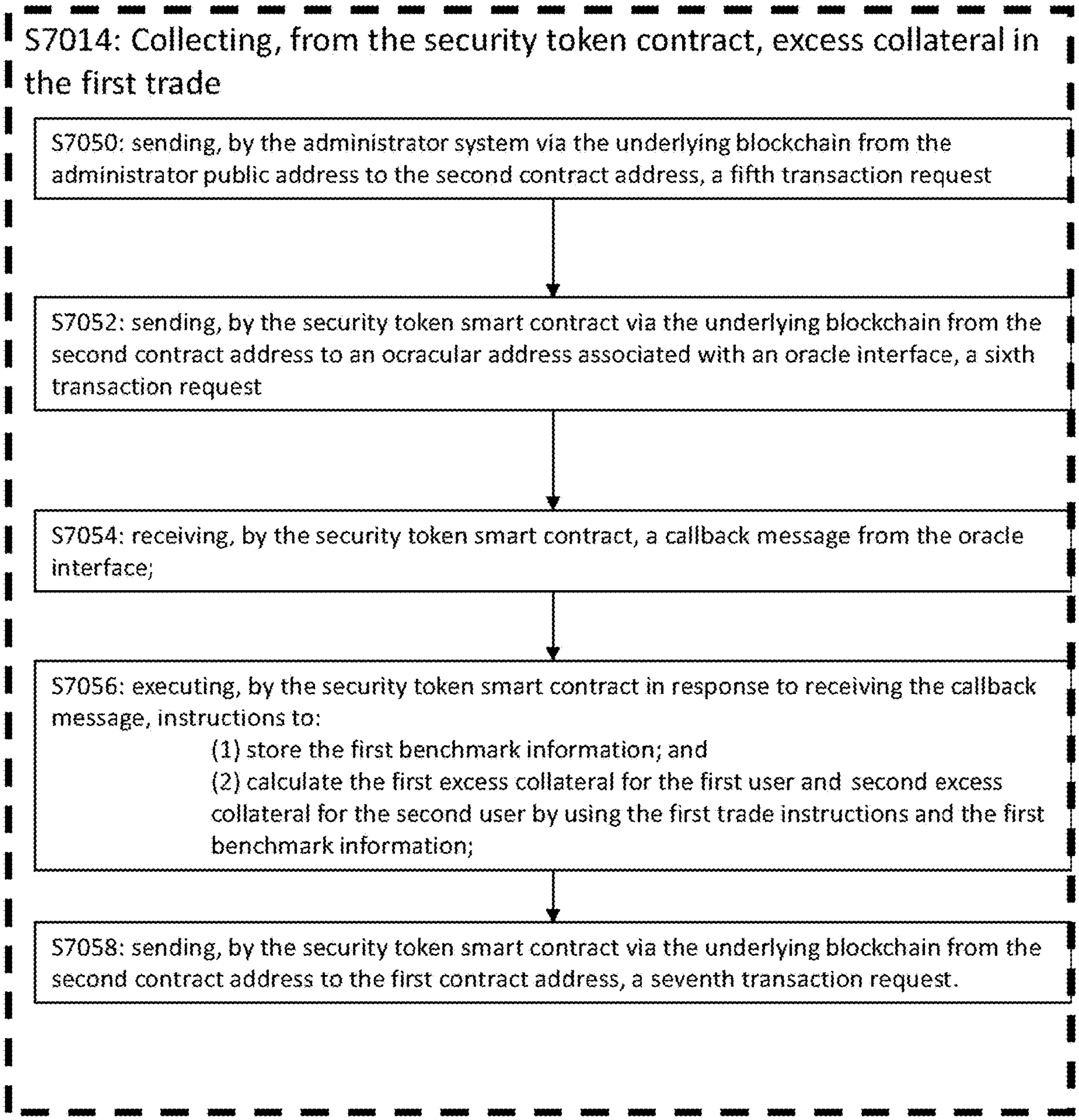
FIG. 26E is a flowchart of an exemplary sub-process of collecting excess collateral from a first user or a second user in a trade in accordance with exemplary embodiments.

Referring to FIG. 26E, in embodiments, collecting excess collateral may begin at step S7050. In step S7050, the administrator system 6801 may send a fifth transaction request from the administrator public address to the second contract address 6805A via the underlying blockchain 6803. In embodiments, the fifth transaction request may include a fifth message comprising requests for the security token smart contract 6805B to determine and distribute excess collateral for the first trade in accordance with the security token smart contract 6805B and the first trade instructions. The fifth transaction request may be electronically signed by the administrator private key. The administrator private key is mathematically related to the administrator public address.

In response to the requests contained in the fifth message, as shown in step S7052, the security token smart contract 6805B sends a sixth transaction request from the second contract address 6805A to an oracle address associated with an oracle smart contract on the blockchain 6803 associated with an oracle interface in contact with a trusted third party database. The sixth transaction request, in embodiments, may include a sixth message to obtain first benchmark data from the trusted third party database. In response to sending the sixth transaction request, in step S7054, the security token smart contract 6805B may receive a callback message from the oracle interface including the first benchmark information. In embodiments, access to the trusted third party database through the oracle smart contract may be limited to certain authorized or approved addresses on the blockchain. In embodiments, as described further below, a whitelist of authorized (or approved) requesting addresses may be provide in which the first benchmark information is provided only in response to requests from an authorized address. In embodiments, the whitelist of authorized requesting addresses may be updated. In embodiments, the administrator system may update the whitelist of authorized requesting addresses to reflect the address of the security token contract that is provided using the process of the present application.

Referring to FIG. 114B, an oracle may produce benchmark data in the form of a first digitally signed benchmark message 9604. In embodiments, the first digitally signed benchmark message 9604 may include one or more of the following: (1) oracle identification 9616 (e.g., a unique identifier that may be used to identify the oracle submitting the first digitally signed benchmark message 9618); (2) first current benchmark data 9618 (e.g., the information being retrieved and published by the oracle to settle the contract); (3) first time stamp 9620 (e.g., the time at which the first current benchmark data 9618 was retrieved); (4) an oracle digital signature 9622 (e.g., a private key associated with the oracle public address 6813); and/or (5) the public address of the party who requested the first current benchmark data 9618 (e.g., a public address associated with the administrator 6801, the first user, the second user, and/or a watchtower, to name a few), to name a few. In embodiments, the first digitally signed benchmark message 9604 may be sent from an oracle public address to the second smart contract address via the blockchain.

In embodiments, the benchmark information received from the oracle may be disputed. For example, in embodiments, the oracle may be associated with multiple published contracts and be tasked to provide each of those smart contracts with current benchmark data. In embodiments, the oracle may provide second current benchmark data 9628 to a third smart contract address (e.g., not the second smart contract) that differs from the first current benchmark data 9618 provided to the second smart contract address. The first current benchmark data 9618, for example, may be transmitted to the second smart contract address at the same or substantially same time (e.g., the difference in time does not materially affect the benchmark data) as the second current benchmark data 9628 was transmitted to the third smart contract address. In embodiments, any party to the second smart contract may dispute the benchmark data provided by the oracle. In embodiments, the dispute instructions module 6942 may include wait period instructions, that allow for a predetermined wait period (e.g., 10 minutes, 1 hour, 5 hours, 1 day, 5 days, and/or a week, to name a few) for a party to the contract to dispute the current benchmark data provided by the oracle. The dispute instructions module 6942, in embodiments, may set requirements for a dispute message. Referring to FIG. 114A, the dispute message 9602 may be required to include one or more of the following: the first digitally signed benchmark message 9604 (e.g., the information supplied by the oracle to the second smart contract), the second digitally signed benchmark message 9606 (e.g., information provided by the oracle to another smart contract), the first current benchmark data 9608, the first time stamp 9610, the second current benchmark data 9612, second time stamp 9614, and/or a private key associated with the sender of the dispute message 9602. In embodiments, the dispute instructions module 6942 may require the dispute message 9602 to include one or more of the following: (1) evidence of the difference between the benchmark data supplied to the published smart contract between Alice and Bob and the different benchmark data associated with the other smart contract (e.g., not the smart contract between Alice and Bob); (2) evidence of the similarities between the time of the published smart contract and the another published smart contract; (3) a digital signature from the first user (e.g., the first user private key); (4) a digital signature from the second user (e.g., the second user private key); (5) a digital signature from the administrator (e.g., the administrator private key); (6) a designated public address to receive the oracle collateral (associated with, for example, one or more of: the first user, the second user, and/or the administrator, to name a few); and/or (7) a mathematical solution, to name a few. In embodiments, to receive a penalty fee, the second smart contract instructions 6805B may require receipt of a message (e.g., the dispute message 9602) by the second smart contract address 6805A from the first user public address, the second user public address, and/or an administrator public address indicating an error in the oracle supplied benchmark data. If the requirements set forth in the second smart contract instructions 6805B are met, in embodiments, the second smart contract address 6805A may transfer half of the oracle collateral to the first user public address and half of the oracle collateral to the second user address.

In embodiments, the dispute message 9602 may be analyzed to determine whether a penalty fee is warranted—the description of which is located below in connection with steps S9528, S9530, and S9532, described below in connection with FIG. 95C, the description of which applying herein. In embodiments, the dispute message 9602 may be analyzed by the second smart contract and/or the administrator 6801. In embodiments, if it is determined that a penalty fee is warranted (e.g., the information received by the oracle was unreliable and/or incorrect), the penalty fee may be the amount of collateral required by an oracle collateral requirement.

The second smart contract instructions 6805B, in embodiments, may also include instructions to settle based on the benchmark data supplied by the oracle, even if the oracle pays the penalty fee. Alternatively, in embodiments, the second smart contract instructions 6805B may, in the case where the oracle pays the penalty fee, include instructions for the second smart contract 6805 to refund the collateral associated with the first user to the first user and refund the collateral associated with the second user to the second user. In embodiments, in the case where the oracle pays the fee, the second smart contract instructions 6805B may include instructions for the second smart contract 6805 to query an additional oracle to settle the published contract.

In embodiments, the first benchmark information may, as mentioned above, be different and/or substantially different from benchmark information associated with a similar contract associated with the oracle address. In the case where the first benchmark information is different and/or substantially different from benchmark information associated with a similar contract, as mentioned above, the oracle may be required to pay a penalty fee. In the case where the first benchmark information is not different or substantially different from benchmark information associated with a similar contract, an additional transaction request may be generated by the administrator system 6801 (and/or the oracle) and sent to the second smart contract address 6805A. The second smart contract instructions, in embodiments, may require the additional transaction request: (1) be sent after a predetermined amount of time after the oracle sends the first benchmark information; (2) include a ledger of contracts the oracle address is associated with; (3) include the amount of oracle collateral; and/or (4) include a digital signature of the oracle (e.g., the private key associated with the oracle). The second smart contract address 6805A, upon receipt of the additional transaction request, may verify the transaction request by determining whether the one or more requirements associated with the additional transaction request and the second smart contract instructions 6805B are met. If the requirements are met, in embodiments, the second smart contract address 6805B may execute the additional transaction request, resulting in the oracle collateral being returned to the oracle address from the second smart contract address 6805A. If the requirements are not met, in embodiments, the second smart contract instructions 6805B may require the oracle to lose the collateral and be required to pay the penalty fee. In embodiments, if the requirements are not met, the second smart contract instructions 6805B may cause the second smart contract 6805 to generate and send a notification to the oracle address indicating that the additional transaction request was rejected because the requirements were not met.

In embodiments, the first smart contract and the second smart contract may be one smart contract and/or module. In embodiments, a third smart contract and/or module may include the first smart contract and the second smart contract. In embodiments, the first smart contract address and the second smart contract address may be the same smart contract address. In embodiments, the third smart contract address may be the first smart contract address and/or the second smart contract address.

Referring back to FIG. 26E, in embodiments, the whitelist of authorized addresses may be included at the oracle smart contract address. In embodiments, the oracle smart contract address may include authorization instructions to request the first contract address only when the requester address is one of the addresses on the whitelist. In embodiments, the oracle smart contract may include authorization instructions related to an update key pair for updating the whitelist of authorized addresses to allow for the white list to be updated.

In embodiments, the whitelist of authorized addresses may be provided in memory element associated with the trusted third party database. In embodiments, the trusted third party database will not provide the first benchmark information to the oracle contract unless the requester address is included in the whitelist of authorized addresses.

In response to receiving a callback message, in step S7056, the security token smart contract 6805B executes instructions to: (1) store the first benchmark information and (2) calculate the excess collateral for the first user (e.g., the user associated with user device 105*a*) and the second excess collateral for the second user (e.g., the user associated with user device 105*b*) by using the first trade instructions and the first benchmark information. In embodiments, the first excess collateral is the first amount of collateral less the difference between the first benchmark information and the inception value, to the extent it is greater than zero. In embodiments, the second excess collateral is the second amount of collateral less the difference between the inception value and the first benchmark information, to the extent it is greater than zero.

To the extent that the first excess collateral is greater than zero or the second excess collateral is greater than zero, in step S7058, the security token smart contract 6805B sends a seventh transaction request from the second contract address 6805A to the first contract address 6807A via the underlying blockchain 6803. The seventh transaction request, in embodiments, may include a seventh message requesting the stable value token smart contract 6807B to transfer: (1) the first excess collateral in stable value digital asset token from the second contract address 6805A to the first user public address (associated with the first user and user device 105*a*), to the extent the first excess collateral is greater than zero; and (2) the second excess collateral in stable value digital asset token from the second contract address 6805A to the second user public address (associated with the second user and user device 105*b*).

Figure 26F:
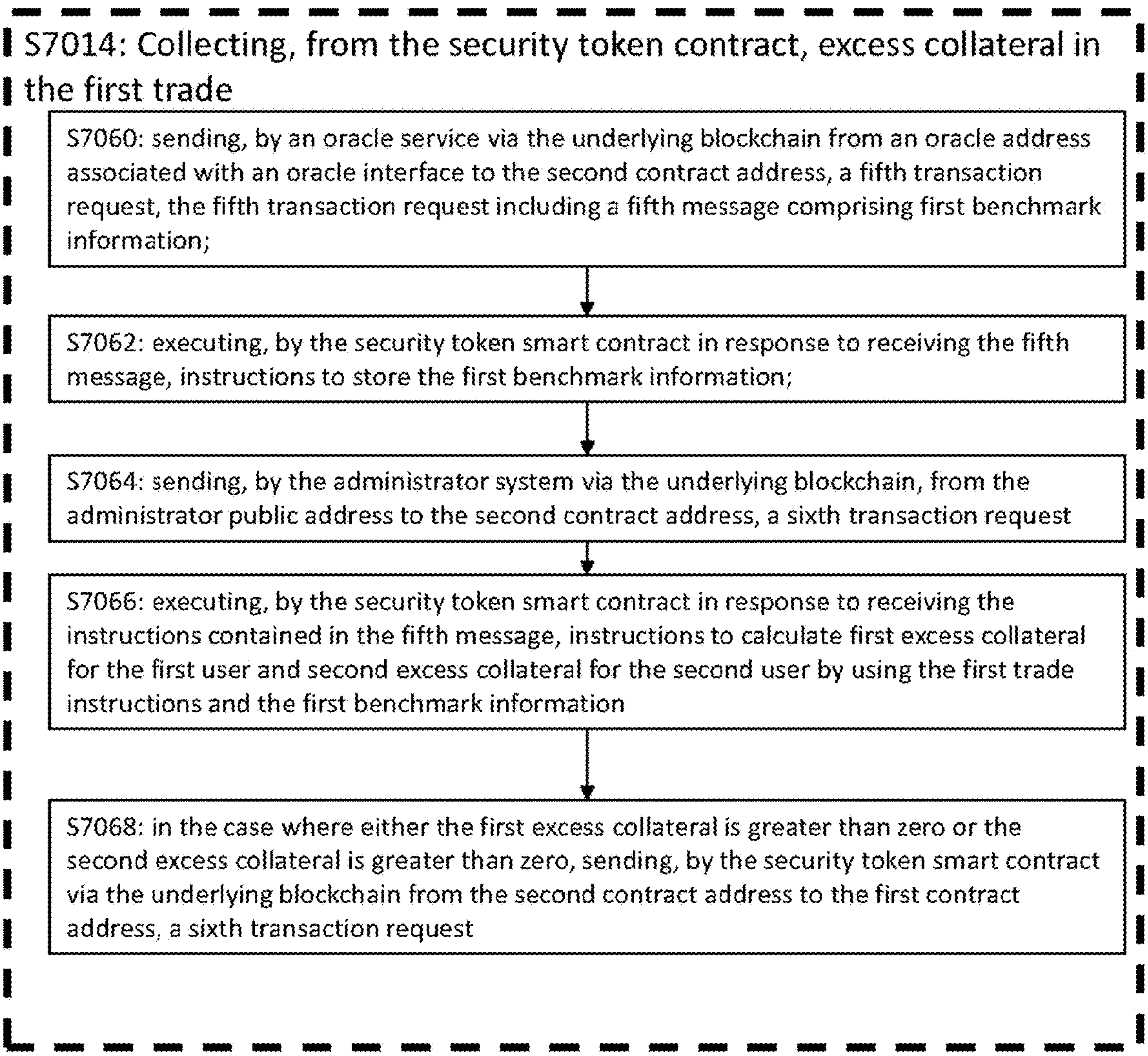
FIG. 26F is a flowchart of another exemplary sub-process of collecting excess collateral from a first user and a second user in a trade in accordance with exemplary embodiments.

Referring to FIG. 26F, in embodiments, collecting excess collateral may begin at step S7060 where an oracle service sends a fifth transaction request from an oracle address associated with an oracle interface to the second contract address 6805A via the underlying blockchain 6803. In embodiments, the fifth transaction request may include a fifth message comprising first benchmark information. In response to receiving the fifth message, in step S7062 the security token contract 6805B executes instructions to store first benchmark information.

The process in FIG. 26F may continue at step S7064. In step S7064, the administrator system 6801 may send a sixth transaction request from the administrator public address to the second contract address 6805A via the underlying blockchain 6803. The sixth transaction request, in embodiments, may include a sixth message comprising requests to the security token smart contract 6805B to determine and distribute excess collateral for the first trade in accordance with the security token smart contract 6805B and the first contract instructions. The sixth transaction request may also be electronically signed by an administrator private key (located in key information data base 6801C of FIG. 24). The administrator private key is mathematically related to the administrator public address. In embodiments, the sixth transaction request may be sent by user device 105*a* from the first user public address (associated with a first user and user device 105*a*) to the second contract address 6805A. In embodiments, where the sixth transaction request is sent by user device 105*a*, the sixth transaction request may also be electronically signed by a first user private key. The first user private key is mathematically related to the first user public address. Furthermore, in embodiments, the sixth transaction request may be sent by user device 105*b* from the second user public address (associated with a second user and user device 105*b*) to the second contract address 6805A. In embodiments, where the sixth transaction request is sent by user device 105*b*, the sixth transaction request may also be electronically signed by a second user private key. The second user private key is mathematically related to the second user public address.

In response to the requests contained in the sixth message, in step S7014'D, the security token smart contract 6805B executes instructions via the blockchain 6803 to calculate first excess collateral for the first user (e.g., a user associated with user device 105*a*) and second excess collateral for the second user (e.g., a user associated with user device 105*b*) using the first trade instructions and the first benchmark information. In embodiments, the first excess collateral is the first amount of collateral less the difference between the first benchmark information and the inception value, to the extent it is greater than zero. In embodiments, the second excess collateral is the second amount of collateral less the difference between the inception value and the first benchmark information, to the extent it is greater than zero.

To the extent that the first excess collateral is greater than zero or the second excess collateral is greater than zero, in step S7014'E, the security token smart contract 6805B sends a seventh transaction request from the second contract address 6805A to the first contract address 6807A via the underlying blockchain 6803. The seventh transaction request, in embodiments, may include a seventh message requesting the stable value token smart contract 6807B to transfer: (1) the first excess collateral in stable value token from the second contract address 6805A to the first user public address (associated with the first user and user device 105*a*), to the extent the first excess collateral is greater than zero; and (2) the second excess collateral in stable value token from the second contract address 6805A to the second user public address (associated with the second user and user device 105*b*). As in step S7014E, if there is excess collateral, the second contract address 6805A sends the excess collateral to the user of which that excess collateral belongs.

In embodiments, such as the embodiments where a third user response and fourth user response are received by the administrator system and matched, the administrator system may set up a second trade between the fourth user and the fifth user. This process of setting up a trade between two users may be similar to the process described in connection with FIGS. 26B-26D, the same description applying herein.

In embodiments, the steps within the process described above in connection with FIGS. 26A-26F may be rearranged or omitted.

In embodiments, a separate security token smart contract may be generated and published to the underlying blockchain for each separate trade.

For example, in embodiments, generating a security token smart contract between a first user and a second user may be implemented, in accordance with the following example. In embodiments, generating a security token smart contract between a first user and a second user may begin with an administrator system associated with an administrator 6809 of a security token smart contract receiving a contract proposal. In embodiments, the security token smart contract is maintained on a distributed public transaction ledger maintained by a plurality of geographically distributed computer systems in a peer-to-peer network in the form of a blockchain 6803 of an underlying digital asset. In embodiments, the underlying digital asset may be a digital math-based asset, ETHER, or NEO, to name a few. In embodiments, the contract proposal includes: first user information associated with a first user device 105*a* that is associated with a first user; and first contract information including at least the following contract parameters 6801B: an inception date 6902; an inception value 6904; at least one benchmark 6906; a contract duration 6908; at least one collateral requirement 6910; a notional value of the smart contract 6912; and first side information, including identification of a first leg of the contract (e.g., the side information including a leg of a contract described in FIGS. 27C-27F—ref. nos. 7138, 7144, 7154, 7160 respectively). In embodiments, the first user information further includes a first user public address (e.g., Alice Public Address 7146 described above in reference to FIG. 27D) associated with the blockchain 6803 of the underlying digital asset. In embodiments, the first user public address corresponds to a first user private key that is mathematically related to the first user public address. In embodiments, the first contract information further includes at least one of the following: derivative type information; early termination rules 6914; a second benchmark 6916; asset identification information; pricing model information; and volatility information. In embodiments, the first contract information further includes first collateral information in stable value tokens (e.g., 100 Stable Value Coins 7148 described above in reference to FIG. 27D). In embodiments, the first contract information further includes second collateral information in stable value tokens. In embodiments, the first contract information includes first transaction fee information. In embodiments, the administrator system may generate graphical user interface information including at least one prompt for the first user to provide the contract proposal. The administrator system may then send the graphical user interface information to the first user device. In embodiments, the administrator system may then receive the contract proposal in response to the at least one prompt.

In embodiments, the method continues with the administrator system receiving at least one indication of interest (e.g., second indication of interest 7150 described above in reference to FIG. 27E). In embodiments, the at least one indication of interest includes at least a first user response, from a second user device 105*b* associated with a second user. In embodiments, the first user response includes second user information associated with the second user. In embodiments, the second user information further includes a second user public address (e.g., Bob Public Address 7162) associated with the blockchain 6803 of the underlying digital asset. In embodiments, the second user public address corresponds to a second user private key that is mathematically related to the second user public address. In embodiments, the first user response further includes second side information which may include an identification of a second leg of the contract (e.g., the side information including a leg of a contract described in FIGS. 27C-27F—reference numbers 7138, 7144, 7154, and 7160 respectively).

In embodiments, the method continues with the administrator system matching the first contract information and the first user response. Matching, by the administrator system, may be similar to S7006 of FIG. 26A.

In embodiments, the method continues with an administrator system providing a stable value token smart contract associated with a stable value token 6807 and first smart contract instructions 6807B for a digital asset token. The digital asset token, in embodiments, may be associated with a first smart contract address 6807A that may be associated with the blockchain 6803 for the underlying digital asset. In embodiments, the first smart contract instructions 6807B are saved in the blockchain 6803 for the underlying digital asset. In embodiments, the first smart contract instructions 6807B include: first authorization instructions regarding creating stable value tokens (which may be included in the create stable value token module 6934); second authorization instructions regarding transferring stable value tokens (which may be included in the transfer stable value token module 6936); third authorization instructions regarding destroying stable value tokens (which may be included in the destroy stable value token module 6938); and fourth authorization instructions regarding functions associated with the stable value token (which may be included in the authorization instruction module 6940). In embodiments, the first smart contract instructions of the first stable value smart contract are associated with more than one smart contract address. For example, Smart Contract Address 6807A may be associated with a plurality of smart contract addresses associated with the blockchain 6803 for the underlying digital asset.

In embodiments, the method continues with the administrator system generating the security token smart contract, which may be associated with a security token 6805 and second smart contract instructions 6805B which may be associated with a second smart contract address 6805A which may be associated with the blockchain for the underlying digital asset. In embodiments, the second smart contract instructions 6805B are saved in the blockchain 6803 for the underlying digital asset. In embodiments, the second smart contract instructions 6805B include: first trade instructions for the security token smart contract (which may be similar to step S7016 described above in reference to FIG. 26B), fifth authorization instructions regarding transferring security tokens (which may be included in transfer security tokens module 6920); sixth authorization instructions regarding destroying security tokens (which may be included in destroy security tokens module 6922); seventh authorization instructions regarding transferring stable value tokens to the second contract address (which may be included in authorize instructions module 6926); eighth authorization instructions regarding transferring stable value tokens from the second contract address (which may be included in authorize instructions module 6926); and calculating instructions regarding calculating excess collateral (which may be included in calculate excess collateral module 6928). In embodiments, the first trade instructions include execution instructions to execute a first trade between the first user and the second user (which may be included in authorize instructions module 6926). In embodiments, the first trade is based on at least: the contract proposal and the first user response.

In embodiments, the method continues with the administrator system sending the security token smart contract and associated second smart contract instructions. In embodiments, the security token smart contract and associated second smart contract instructions 6805B may be sent via the blockchain 6803 for the underlying digital asset to the second smart contract address 6805A.

In embodiments, the method may continue with the second smart contract address 6805A receiving a first amount of collateral. In embodiments, the first amount of collateral may be a first amount of stable value tokens associated with the first user as collateral. In embodiments, the first amount of stable value tokens associated with the first user is based on the at least one collateral requirement 6910. In embodiments, the first user device **105*a* may send a first message. The first message may include a request to transfer the first amount of collateral from the first user public address to the second smart contract address. In embodiments, the first message may be sent via the underlying blockchain 6803 from the first user public address associated with the underlying blockchain 6803 to the first smart contract address 6807A associated with the underlying blockchain 6803. In embodiments, the first user device 105*a* may send a second message to the first smart contract address 6807A. The second message may include authorization for the security token smart contract to request a transfer of the first amount of collateral. In embodiments, the administrator system may send a third message including instructions to send a request from the second smart contract address 6805A to the first smart contract address 6807A. The request, in embodiments, may be for the first amount of collateral to be transferred from the first user public address to the second smart contract address 6805A. In embodiments, the third message is sent by the administrator system via the underlying blockchain 6803 to the second smart contract address 6805**A.

In embodiments, the method may continue with the second smart contract address 6805A receiving a second amount of collateral. In embodiments, the second amount of collateral may be a second amount stable value tokens associated with the second user as collateral. In embodiments, the second amount of stable value tokens associated with the second user is based on the at least one collateral requirement 6910. In embodiments, the second user device **105*b* may send a fourth message including a request. In embodiments, the request may be to transfer the second amount of collateral from the second user public address to the second smart contract address 6805A. In embodiments, the fourth message may be sent via the underlying blockchain 6803 from the second user public address associated with the underlying blockchain 6803 to the first smart contract address 6807A associated with the underlying blockchain 6803. In embodiments, the second user device 105*b* may send a fifth message to the first smart contract address 6807A. The fifth message, in embodiments, may include authorization for the security token smart contract to request a transfer of the second amount of collateral via the blockchain 6803. In embodiments, the administrator system may send a sixth message. The sixth message, in embodiments, may include instructions to send a request. The request, in embodiments, may be for the second amount of collateral to be transferred from the second user public address to the second smart contract address 6805A. In embodiments, the sixth message is sent via the underlying blockchain 6803 to the second smart contract address 6805**A.

In embodiments, the first trade instructions are implemented via the blockchain for the underlying digital asset by computer systems among the plurality of geographically distributed computer systems in the peer-to-peer network. In embodiments, the first trade instructions are implemented as a result of a message sent from the administrator system via the blockchain 6803 to the second smart contract address 6805A.

In embodiments, the method may continue with the first collateral amount being recalculated based on the at least one collateral requirement 6910 and current benchmark information (this may be similar to steps S6310 and S6311, both described above in reference to FIG. 63C). In embodiments, the recalculation may be performed by the first user device **105*a*. In embodiments, the recalculation is performed by the administrator system. In embodiments, a first additional collateral amount may be determined based on a difference between the recalculated first collateral amount and the first collateral amount. The first additional collateral amount may then be received at the second smart contract address 6805A. In embodiments, the first additional collateral may not be received. In embodiments, the administrator system may generate an alert. The alert, in embodiments, may include the first additional collateral amount. Once generated, the administrator system may send the alert to the first user device 105*a*. In embodiments, the alert may be generated and sent by security token smart contract to the first user device 105*a* (e.g., using the generate collateral information message module 6930 and the send collateral information message module 6932). Once the alert regarding the first additional collateral amount is received by the first user device 105*a*, the method may continue with the administrator system monitoring the second contract address 6805A on the blockchain 6803 associated with the underlying digital asset (this may be similar to step S7034 described above in reference to FIG. 26C). The administrator system may then, in embodiments, determine whether the first additional collateral amount is received by the second contract address 6805A (this may be similar to step S7034 described above in reference to FIG. 26C). If the first additional collateral is not received by the second contract address 6805A, the administrator system may generate a default notification. The default notification may be sent by the administrator system to at least one of the first user device 105*a*, the second user device 105*b*, and the second smart contract address 6805A. In embodiments, the default notification may be generated and sent by security token smart contract to at least one of the first user device 105*a* and the second user device 105*b* (e.g., using the generate collateral information message module 6930 and the send collateral information message module 6932). After the default notification is sent, the administrator system, in embodiments, may generate a seventh message. The seventh message, in embodiments, may include a request to transfer the first collateral amount and the second collateral amount in accordance with the first trade instructions. The seventh message may be sent by the administrator system to the second smart contract address 6805**A. In embodiments, the transfers of the first collateral amount and the second collateral amount are implemented by the plurality of geographically distributed computer systems in the peer-to-peer network.

In embodiments, the method may continue with the second collateral amount being recalculated based on the at least one collateral requirement 6910 and current benchmark information (this may be similar to steps S6310 and S6311, both described above in reference to FIG. 63C). In embodiments, the recalculating step is performed by the second user device **105*b*. In embodiments, the recalculating step is performed by the administrator system. In embodiments, a second additional collateral amount may be determined based on a difference between the recalculated second collateral amount and the second collateral amount. In embodiments, the second additional collateral amount is received at the second smart contract address 6805A. In embodiments, the second additional collateral may not be received and the administrator system may generate an alert. The alert, in embodiments, may include the second additional collateral amount. Once generated, the administrator system may send the alert to the second user device 105***b*. In embodiments, the alert may be generated and sent by security token smart contract to the second user device 105*b* (e.g., using the generate collateral information message module 6930 and the send collateral information message module 6932). Once the alert regarding the second additional collateral amount is received by the second user device 105*b*, the method may continue with the administrator system monitoring the second smart contract address 6805A on the blockchain 6803 associated with the underlying digital asset (this may be similar to step S7034 described above in reference to FIG. 26C). The administrator system may monitor the second smart contract address 6805A to determine whether the second additional collateral amount is received by the second contract address (this may be similar to step S7034 described above in reference to FIG. 26C). If the administrator system determines that the second additional collateral amount is not received by the second smart contract address 6805A, the administrator system may generate a default notification. The default notification may be sent by the administrator system to at least one of: the first user device 105*a*, the second user device 105*b*, and the second smart contract address 6805A. In embodiments, the default notification may be generated and sent by security token smart contract to at least one of the first user device 105*a* and the second user device 105*b* (e.g., using the generate collateral information message module 6930 and the send collateral information message module 6932). After sending the default notification, the administrator system may generate an eighth message. The eighth message, in embodiments, may include a request to transfer the first collateral amount and the second collateral amount in accordance with the first trade instructions. The eighth message, In embodiments, may be sent by the administrator system to the second smart contract address 6805A, where transfers of the first collateral amount and the second collateral amount are implemented by the plurality of geographically distributed computer systems in the peer-to-peer network.

In embodiments, the method may include the administrator system determining, at the end of the contract duration, a payout amount based on at least the first trade instructions. The payout instructions may be generated by the administrator system. In embodiments, the payout instructions may be based at least on the first side information and the second side information (e.g., the first and/or second side information including a leg of a contract described in FIGS. 27C-27F—ref nos. 7138, 7144, 7154, 7160 respectively). The administrator system may, in embodiments, send the payout instructions to the second contract address 6805A via the blockchain 6803 for the underlying digital asset. The payout instructions may provide the payout amount to one of the first user public address and the second user public address. The payout amount, in embodiments, being based on at least the first trade instructions. In embodiments, the payout instructions are implemented by the plurality of geographically distributed computer systems in the peer-to-peer network.

In embodiments, the method may include the administrator system collecting excess collateral from the first trade (this may be similar to S7014 described above in reference to FIGS. 26A, 26E, and 26F). The administrator system may collect excess collateral by first sending a ninth message to the second smart contract address 6805A via the underlying blockchain 6803 for the underlying digital asset. The ninth message may include, in embodiments, requests for the security token to: determine first excess collateral for the first trade in accordance with the security token smart contract (this may be similar to S7014 described above in reference to FIGS. 26A, 26E, and 26F) and the first trade instructions; determine second excess collateral for the first trade in accordance with the security token smart contract and the first trade instructions (this may be similar to S7014 described above in reference to FIGS. 26A, 26E, and 26F); distribute the first excess collateral for the first trade in accordance with the security token smart contract and the first trade instructions to the first user address (this may be similar to S7014 described above in reference to FIGS. 26A, 26E, and 26F); and distribute the second excess collateral for the first trade in accordance with the security token smart contract and the first trade instructions to the second user address (this may be similar to S7014 described above in reference to FIGS. 26A, 26E, and 26F).

In embodiments, the administrator system may return the remaining collateral from the first trade (this may be similar to S7014 described above in reference to FIGS. 26A, 26E, and 26F). The remaining collateral, in embodiments, may be from the security token smart contract. In embodiments, returning the remaining collateral may begin by the administrator system sending a tenth message to the second smart contract address 6805. The tenth message, in embodiments, may include requests for the security token smart contract to: determine first remaining collateral for the first trade in accordance with the security token smart contract and the first trade instructions (e.g., using calculate excess collateral module 6928); determine second remaining collateral for the first trade in accordance with the security token smart contract and the first trade instructions (e.g., using calculate excess collateral module 6928); distribute the first remaining collateral for the first trade in accordance with the security token smart contract and the first trade instructions; and distribute the second remaining collateral for the first trade in accordance with the security token smart contract and the first trade instructions (this may be similar to S7014 described above in reference to FIGS. 26A, 26E, and 26F).

In embodiments, a first benchmark value 6906 may be determined. The first benchmark value 6906 may be determined by the security token smart contract sending, via the blockchain 6803 for the underlying digital asset, a request. The request may be sent from the second smart contract address 6805A to an oracle smart contract at a third contract address associated with the blockchain 6803 for the underlying digital asset (this may be similar to S7014 described above in reference to FIGS. 26A, 26E, and 26F). The oracle smart contract may be associated with an oracle interface in contact with an authorized third party database. The request may include an eleventh message (this may be similar to S7014 described above in reference to FIGS. 26A, 26E, and 26F). The eleventh message may include a request to obtain first benchmark value 6906 (this may be similar to S7014 described above in reference to FIGS. 26A, 26E, and 26F). In response to the eleventh message, the oracle smart contract may send the first benchmark value 6906 to the security token smart contract (this may be similar to S7014 described above in reference to FIGS. 26A, 26E, and 26F). In response to receiving the first benchmark value, the security token smart contract may execute instructions to store the first benchmark value 6906.

In the case where the first excess collateral is greater than zero the first excess collateral may be calculated for the first user (this may be similar to S7014 described above in reference to FIGS. 26A, 26E, and 26F). In the case where the second excess collateral is greater than zero, the second excess collateral may be calculated for the second user (this may be similar to S7014 described above in reference to FIGS. 26A, 26E, and 26F). The first and second excess collateral, in embodiments, may be calculated using the first trade instructions and the first benchmark information 6906 (this may be similar to S7014 described above in reference to FIGS. 26A, 26E, and 26F). Once the excess collateral is calculated, the second smart contract address may send a twelfth message to the first smart contract address. The twelfth message may include a request for the stable value token smart contract to transfer the excess collateral—the first excess collateral being requested to transfer if greater than zero and the second excess collateral being requested to transfer if greater than zero (this may be similar to S7014 described above in reference to FIGS. 26A, 26E, and 26F).

FIG. 80 illustrates an exemplary embodiment of an exchange trading system in accordance with embodiments of the present invention. An interactive order entry system may provide one or more interfaces through which exchange customers may initiate exchange transactions. An automated order entry system may comprise one or more trading APIs that allow customer computer-initiated transactions. Orders may be electronically stored in an electronic pending order book. An exchange order matching engine, which can comprise a computer system, may match bids and asks or otherwise match buyers and sellers of pending transactions. A transaction ledger may track transactions. A settlement engine may process the transactions, which may include providing trade confirmations or otherwise carrying out the transactions.

In embodiments, a digital asset exchange may employ systems and methods to manage and/or reduce digital asset transaction change. Digital asset transaction change refers to leftover digital asset amounts from transactions in digital asset systems, such as BITCOIN, where the transactions are comprised of one or more digital inputs and outputs. A wallet stores unspent transaction outputs, which it can use as digital inputs for future transactions. In embodiments, a wallet or third-party system may store an electronic log of digital outputs to track the outputs associated with the assets contained in each wallet. In digital asset systems such as BITCOIN, digital inputs and outputs cannot be subdivided. For example, if a first wallet is initially empty and receives a transaction output of 20 BTC from a second wallet, the first wallet then stores that 20 BTC output for future use as a transaction input. To send 15 BTC, the first wallet must use the 20 BTC as an input, 15 BTC of which will be a spent output that is sent to the desired destination and 5 BTC of which will be an unspent output, which is transaction change that returns to the first wallet. A wallet with digital assets stored as multiple digital outputs can select any combination of those outputs for use as digital inputs in a spending transaction.

For transactions involving sending digital assets from exchange wallets to non-exchange wallets (e.g., when a user requests a withdrawal of digital assets from the user's exchange account), a digital asset exchange may employ systems and methods to reduce transaction change, e.g., to avoid a temporary decrease in liquidity due to the unavailability of funds during a transaction confirmation period, to which the change in systems such as BITCOIN is subject.

To manage and/or reduce transaction change, in embodiments, an exchange may maintain wallets containing varying sized digital outputs so that an output or combination of outputs can be selected as digital input for a transaction, where the total input amount can have a size either equal to or greater than but close to the transaction amount. Accordingly, the exchange may employ a wallet balancing module running one or more balancing algorithms on one or more processors to distribute digital assets to wallets in digital outputs of various sizes and various quantities of each size. These output sizes and quantities thereof may be predetermined and programmed into the wallet balancing module and/or may be adjusted algorithmically to better reduce transaction change in light of actual current or historical exchange transaction activity. Wallet balancing operations may be performed continuously, periodically throughout a day, once a day (e.g., at midnight), once a week, at some other interval, as balancing is required for one or more transactions, and/or as the wallet balancing module determines a wallet imbalance that exceeds a threshold tolerable imbalance. In embodiments, an exchange wallet balancing module may perform balancing operations after receiving a digital asset withdrawal request from a user and before transferring the digital assets to the user.

An exchange may also reduce transaction change by programming multiple outputs for a single transaction. In embodiments, digital asset withdrawals may be processed only at specified times or periodically, e.g., in the morning and in the evening. Such a system may facilitate batch processing of withdrawals using multiple digital transaction outputs. In embodiments, digital asset storage or protection services, such as insurance or storage warranties, may be offered through a digital asset exchange. Transaction insurance or warranties may also be offered, e.g., to guarantee an exchange transaction for a particular volume at a particular price.

Wrapping and Unwrapping Digital Assets

Users, including customers of a digital asset exchange (or other token issuer), for example, in embodiments, may request generation of, or may otherwise obtain, stable value digital asset tokens maintained on a first blockchain that are associated with a first digital asset maintained on a second blockchain based on a fixed ratio between the stable value digital asset token and the first digital asset. In embodiments, this may include "wrapping" the first digital assets to provide stable value digital asset tokens on the first blockchain. In embodiments, one or more first digital assets maintained on the second blockchain may be provided by the user, or on behalf of the user, to the token issuer and held or controlled by the token issuer, who may then issue or otherwise obtain stable value digital asset tokens maintained on the first blockchain to allow users to "use" the first digital asset on the second blockchain (e.g., second blockchain 11726) in the form of the stable value digital asset token on the first blockchain (first blockchain 11712).

In embodiments, the first blockchain may be a blockchain that supports smart contracts and tokens, such as the ETHEREUM blockchain, the NEO blockchain, to name a few. In embodiments, the first digital asset on the second blockchain may be FILECOIN on the FILECOIN blockchain, BITCOIN on the BITCOIN blockchain, BITCOIN CASH on the BITCOIN CASH blockchain, LITECOIN on the LITECOIN blockchain, ZCash on the ZCASH blockchain, POKADOT (or DOT) on the POKADOT blockchain, TEZOS (or XTZ) on the TEZOS blockchain, or Aprotecol, TOM on the COSMOS HUB blockchain, to name a few.

For example, a first user (e.g., vendor(s) 140) may own 10 FILECOINS which are maintained on the FILECOIN blockchain and seek to conduct transactions with or involving one or more smart contracts (e.g., DeFi, and/or Security Tokens, to name a few) on a different blockchain, like the ETHEREUM blockchain. A technical challenge arises in that this requires cross-chain interactions since the first asset is maintained on the second respective blockchain while the smart contracts may be provided on a different blockchain, for example utilizing e.g., ERC720 protocol on the ETHEREUM blockchain. Conventional blockchain technology cannot handle interactions directly involving tokens (or smart contracts), digital assets, and/or coins from different blockchains (e.g., the FILECOIN blockchain, the BITCOIN blockchain, the LITECOIN blockchain, to name a few). For example, the FILECOIN blockchain, itself, in embodiments, does not enable users to utilize functionality associated with the ERC720 protocol associated with the ETHEREUM blockchain. Thus, conventional blockchain technology suffers from a technical problem in that it does not allow for interaction between blockchains to allow use of assets on one blockchain with smart contracts or other assets on a second blockchain.

The method and system of the present application provide a technical solution to the technical problems presented with respect to conventional blockchain technology discussed above. Continuing the example, if the first user would like to utilize its 10 FILECOIN with respect to a smart contract on the ETHEREUM blockchain, such as with respect to one or more functions associated with ERC720 protocol on the ETHEREUM blockchain and/or ERC721 protocol on the ETHEREUM blockchain, to name a few, in accordance with embodiments of the invention, the first user may use a stable value token issued on the ETHEREUM blockchain, each stable value token being pegged (associated based on a predetermined ratio) to the FILECOIN (i.e., in this case, e.g., each EFIL token may be pegged on a one-to-one basis with FILECOIN, however other ratios may be used, for example, 100 to 1, 1000 to 1, etc.). As noted, the process of generating stable value tokens associated with one or more digital assets on a different blockchain may be referred to as "wrapping." Similarly, the process of burning (or disabling or destroying) such stable value tokens may be referred to as "unwrapping." FILECOIN is used for the purposes of this example in the description of FIGS. 118-120, however, any other digital asset may be used. In embodiments, the digital asset to be wrapped (in this example, FILECOIN), may be or include, other types of digital asset which are maintained on a different blockchain, for example, BITCOIN, LITECOIN, BITCOIN CASH, AAX, and/or ZCASH, to name a few. In embodiments, where the stable value token is pegged to a FILECOIN, it may be referred to as EFIL, for example. In embodiments, the stable value token may be associated with another digital asset, in which case it may be referred to as EBTC, EBCH, ELTC, EAAX, and/or EZEC, to name a few.

In embodiments, to generate a stable value token (e.g., EFIL) on the first blockchain (e.g., ETHEREUM blockchain) pegged to a second digital asset on a different, second blockchain (e.g., FILECOIN on the FILECOIN network), continuing the example, the first user via an associated first user device may send an electronic request to an administrator computer system associated with an administrator. In embodiments, the administrator computer system may be a digital asset exchange computer system associated with a digital asset exchange, a digital asset token issuer computer system associated with a digital asset token issuer, to name a few. In embodiments, such a request may be via a secure channel, such as an encrypted communication. For example, the communication may be using an asymmetric key, such as a PKI key, or using a symmetric key, such as used in TLS, to name a few. The communication, in embodiments, may be encrypted by the sender (e.g., a first user device associated with the first user) and/or the recipient (e.g., a first user device associated with the administrator (e.g., the digital asset exchange computer system 6102)), to name a few.

The administrator computer system, continuing the example, may receive the communication. In response to the received communication, in embodiments, the administrator computer system may generate an electronic response to the first user's electronic request. The electronic response, in embodiments, may include instructions on how to transfer the 10 FILECOIN from a first public address on a second blockchain (e.g., a first user public address associated with the first user on the FILECOIN blockchain) associated with the first user, to a designated public address on the second blockchain (e.g., one or more public addresses where digital assets to be wrapped are deposited—e.g., the second user public address 11728). For example, the electronic response may include second public address information, e.g., information indicating the second designated public address, such as an alpha-numeric public address, and/or a QR code representation of the alpha-numeric public address, to name a few. In embodiments, such a response may be sent via a secure channel, such as an encrypted communication. For example, the electronic response may be encrypted using an asymmetric key, such as a PKI key, and/or using a symmetric key, such as used in TLS, to name a few. The electronic response, in embodiments, may be encrypted by the sender (e.g., the administrator computer system) and/or the recipient (e.g., the first user device), to name a few. In embodiments, where, prior to the electronic request, the first user already has access to the second public address information, it may not be necessary for the first user device to communicate with the administrator computer system (e.g., the electronic request) and the first user can instead transfer the desired amount of digital asset to be wrapped directly to the designated public address.

In embodiments, the first user may send the electronic request to the administrator via a first user (e.g., First user device(s) 11704 . . . Nth First user device(s) 11704N). The first user, (e.g., the first user device(s) 11704), may be authorized (e.g., by an administrator or digital asset token issuer, to name a few) to request the generation of the stable value token (e.g., EFIL). In this context, a first user is trusted in the sense that it is authorized to interact with the administrator.

Continuing the example, the first user device may generate a transaction request including instructions to transfer the 10 FILECOIN on the FILECOIN Network from a public address associated with the first user on the FILECOIN Network to a designated public address (e.g., second user public address 11728) on the FILECOIN Network (e.g., Second Blockchain 11726) associated with the administrator. In embodiments, the transaction request may include a storage deal (e.g., with one or more storage miners on the FILECOIN Network) and/or a retrieval deal (e.g., with one or more retrieval miners on the FILECOIN Network). In embodiments, such as with other digital assets, the transaction request may include other pertinent requests. In embodiments, storage miners and retrieval miners may be separate entities. In embodiments, one or more storage miners may also be retrieval miners (and vice versa).

The transaction request, in embodiments, may include (1) instructions to transfer the 10 FILECOIN from the public address associated with the first user and/or (2) instructions to store the 10 FILECOIN in the designated public address, as well as a digital signature generated by one or more private key(s) associated with the entity transferring the FILECOIN. In embodiments, the transaction request may include one or more transaction requests (e.g., the first transaction request including retrieval instructions). The transaction request, in embodiments, may include instructions to account for one or more fees on the blockchain. For example, the transaction request may include instructions to account for a dynamic BaseFee which may be adjusted based on network congestion parameters (e.g., block sizes).

Continuing the example, the first user may publish the generated transaction request to the FILECOIN Network (e.g., Second Blockchain 11726). In embodiments, such publication will involve sending a message that is digitally signed by the private key (or keys) associated the first public address and include as a recipient at least the second public address. In embodiments, where the first user has access to the reserve public address, it may not be necessary for the first user to contact the first user device and may, instead, send the desired amount of FILECOIN directly to the reserve public address. In embodiments, a blockchain may require one or more transaction requests to execute a transaction having a one or more transfers.

An exemplary system for generating and/or burning a stable value token (e.g., EFIL) associated with a second underlying blockchain (e.g., the ETHEREUM blockchain) pegged to a digital asset (e.g., FILECOIN) associated with a second blockchain (e.g., the second blockchain 11726), is illustrated in connection with FIG. 117A. In embodiments, this process of generating the stable value token may be referred to as "wrapping" a digital asset, and the process of burning the stable value token may be referred to as "unwrapping" a digital asset. For example, the second blockchain (e.g., second blockchain 11726) may be the FILECOIN network, with FILECOIN being the first digital asset (e.g., the digital asset to be wrapped), and the first blockchain (e.g., first blockchain 11712) may be the ETHEREUM blockchain, with EFIL being the stable value token representing a wrapped FILECOIN. In this example, each wrapped FILECOIN (e.g., EFIL token) would be pegged to a constant (e.g., stable) value of the first digital asset (e.g., FILECOIN).

Referring to FIG. 117A, at time TO, the exemplary system may include one or more of the following: an administrator such as digital asset exchange 6110; an administrator computer system such as digital asset exchange computer system 6102, a first user device associated with a first user; one or more vendor(s) 140, two or more blockchain networks (e.g., first blockchain 11712, second blockchain 11726, and/or blockchain 1807, to name a few), one or more third-party monitoring system(s) (not shown), and/or one or more offline reserve(s) 11734, to name a few. A description of the components of the exemplary system illustrated in connection with FIG. 117A is located below, the description of which applying herein.

The first digital asset and/or second digital asset, in embodiments, may be one or more of the following: BITCOIN, NAMECOINS, LITECOINS, PPCOINS, TONAL BITCOINS, BITCOIN CASH, ZCASH, IXCOINS, DEVCOINS, FREICOINS, I0COINS, TERRACOINS, LIQUIDCOINS, BBQCOINS, BITBARS, PHENIXCOINS, RIPPLE, DOGECOINS, MASTERCOINS, BLACKCOINS, ETHER, NXT, BITSHARES-PTS, QUARK, PRIMECOIN, FEATHERCOIN, PEERCOIN, FACEBOOK GLOBAL COIN, STELLAR, TOP 100 TOKENS, TETHER; MAKER; CRYPTO.COM CHAIN; BASIC ATTENTION TOKEN; USD COIN; CHAINLINK; BITTORRENT; OMISEGO; HOLO; TRUEUSD; PUNDI X; ZILLIQA; AUGUR, 0X, AURORA; PAXOS STANDARD TOKEN; HUOBI TOKEN; IOST; DENT; QUBITICA; ENJIN COIN; MAXIMINE COIN; THORECOIN; MAIDSAFECOIN; KUCOIN SHARES; CRYPTO.COM; SOLVE; STATUS; MIXIN; WALTONCHAIN; GOLEM; INSIGHT CHAIN; DAI; VESTCHAIN; AELF; WAX; DIGIXDAO; LOOM NETWORK; NASH EXCHANGE; LATOKEN; HEDGETRADE; LOOPRING; REVAIN; DECENTRALAND; ORBS; NEXT; SANTIMENT NETWORK TOKEN; POPULOUS; NEXO; CELER NETWORK, POWER LEDGER; ODEM; KYBER NETWORK; QASH; BANCOR, CLIPPER COIN; MATIC NETWORK; POLYMATH; FUNFAIR; BREAD; IOTEX; ECOREAL ESTATE; REPO; UTRUST; ARCBLOCK; BUGGYRA COIN ZERO; LAMBDA; IEXEC RLC; STASIS EURS; ENIGMA; QUARKCHAIN; STORJ; UGAS; RLF TOKEN; JAPAN CONTENT TOKEN; FANTOM; EDUCARE; FUSION; GAS; MAINFRAME; BIBOX TOKEN; CRYPTO20; EGRETIA; REN; SYNTHETIX NETWORK TOKEN; VERITASEUM; CORTEX; CINDICATOR; CIVIC; RCHAIN; TENX; KIN; DAPS TOKEN; SINGULARITYNET; QUANT; GNOSIS; INO COIN; ICONOMI; MEDIBLOC [ERC20]; 0X; AION; ALGORAND; AMP; ARCA; ARWEAVE; AUDIUS; AVALANCHE; BCB; BCC; BITCOIN SV; BLOCKSTACKS; CBAT; CDAI; CELA; CELO; CETH; CHIA; CODA; COSMOS; CWBTC; CZRK; DECRED; DFINITY; EOS; ETH 2.0; FILECOIN; HEDGETRADE; ION; KADENA; KYBER NETWORK, MOBILECION; NEAR, NERVOS; OASIS; OMISEGO; PAXG; POLKADOT; SKALE; DIEM; SOLANA; STELLAR; TEZOS; THETA; XRP; DIEM and/or DEW, to name a few. In embodiments, the underlying digital asset may be a digital asset that is supported by its own digital asset network (like ether supported by the ETHEREUM Network, the NEO supported by the NEO Network, to name a few). A digital asset token, in embodiments, may be a stable value token (such as GEMINI DOLLAR, PAXG, EFIL, EDOT, EXTZ, EATOM, to name a few), digital finance tokens that may be associated with decentralized lending (such as AMP, COMPOUND, PROTOCOL, KYBER, UMA, UNISWAP, YEARN, AAVE, to name a few), tokens, non-fungible token (such as CRYPTOKITTIES, Sorar, Decentraland, Goods Unchained, My Crypto Heroes, to name a few), and/or gaming tokens (such as SANDBOX), to name a few.

For example, the first digital asset on a first blockchain may refer to FILECOIN on the FILECOIN peer-to-peer network. FILECOIN, for example, is an underlying digital asset for a peer-to-peer network which stores files, with built-in economic incentives to ensure files are stored reliably over time. Users, in embodiments, receive FILECOIN as compensation for providing storage space, and, to store files on storage miner computers (e.g., a node), users pay in FILECOIN. Other digital assets on other digital asset blockchains (e.g., one or more networks associated with the above, non-exhaustive list of digital assets) may also be used in accordance with embodiments of the present invention. The second digital asset, continuing the above example, may be a stable value digital asset token (e.g., EFIL—representing a "wrapped" FILECOIN) on a first blockchain (e.g., the ETHEREUM blockchain). Other examples of stable value tokens include GEMINI Dollar, PAXG, to name a few. In embodiments, the underlying digital asset of the second blockchain may be a digital asset that is supported by its own digital asset network (like ETHER is supported by the ETHER Network). Other underlying digital assets with their own digital asset networks may be used to the extent such digital asset networks support smart contract functionality and token generation in accordance with embodiments of the present invention.

Wrapping a digital asset (e.g., FILECOIN), in embodiments and referring to FIG. 117B-1 at time T1, may begin with a deposit of a first amount of a first digital asset into a second designated public address (e.g., second first user public address 11728) on a second blockchain (e.g., second blockchain 11726). For example, a first user device (e.g., first user device(s) 11704) may deposit 10 FILECOIN into the second trusted entity public address 11728 on the second blockchain 11726. In this context, in embodiments, a first user device may be "trusted" only in the sense that it is registered to operate within the system. Examples of trust entities, in this context, could include e.g., an administrator, a digital asset exchange, or another entity registered to generate and/or burn stable value coins. In embodiments, as described herein, a stable value digital asset token may be pegged, at a fixed, predetermined ratio, to one or more of the following: fiat, digital asset, a basket of fiat, a basket of digital asset, asset, a basket of assets, a basket of one or more of fiat, digital asset, and/or asset, and/or a combination thereof, to name a few. As described above, the first user may transfer the first amount of the first digital asset in response to one or more requests from one or more users (e.g., vendor(s) 140) to wrap the first amount of the first digital asset. The first amount of the first digital asset, in embodiments, may be the sum of one or more requests to wrap the first digital asset from one or more vendor(s) 140.

Continuing the example, to deposit the first amount of the first digital asset (e.g., 10 FILECOIN) on the second blockchain (e.g., the FILECOIN peer-to-peer network), the first user device may generate and publish (e.g., via network 125) a first transaction request (e.g., First Transaction Request 11736) to deposit a first amount of first digital assets (e.g., 10 FILECOIN) into a second designated address (e.g., Second User Public Address 11728) on the second blockchain (e.g., second blockchain 11728). In embodiments, the publication may involve sending a message which is digitally signed by the private key (or keys) associated with the source public address from which the first amount of first digital asset was transferred (e.g., a first user public address associated with the first user). In embodiments, as discussed in more detail below, the administrator system may monitor the second designated address on the second blockchain to detect whether an electronic deposit has been made. In embodiments, the detection of an electronic deposit at the second designated public address may trigger further action by the system of FIG. 117B-1.

In embodiments, the first user device (e.g., First user device(s) 11704 . . . Nth First user device(s) 11704N) may generate and send a second electronic request to the administrator. The second electronic request, in embodiments, may include one or more of: the amount of the deposit, a request to generate the stable value token (e.g., wrap the first digital asset), a transaction ID, and/or information sufficient to identify the first user device, to name a few. In embodiments, the second electronic request may be sent via a secure channel, such as an encrypted communication. For example, the second electronic request may be encrypted using an asymmetric key, such as a PKI key, or using a symmetric key, such as used in TLS, to name a few. The second electronic request, in embodiments, may be encrypted by the sender (e.g., the first user device) and/or the recipient (e.g., the administrator computer system), to name a few.

In embodiments, the second designated address may be monitored by (and/or on behalf of) the administrator. The administrator, in embodiments, may monitor the second designated public address continuously, in substantially real time, at predetermined intervals (e.g., at the end of a business day, every hour, twice a day, etc.), and/or aperiodically (e.g., when requested), to name a few. In embodiments, the administrator may employ one or more third-parties (e.g., one or more watchtower systems) to monitor the second designated public address (and/or other public addresses associated with the issuance and/or burning of the digital asset tokens and/or digital assets) for any activity (e.g., a published transaction, a published message, a published transaction intent, to name a few). To enable a third-party to monitor the second designated public address (and/or other public addresses associated with the issuance of the digital asset tokens), the administrator may generate and transmit monitoring information to a third-party computer system associated with the one or more third-parties via network 125. In embodiments, the transmission would be via a secure transmission channel, such as an encrypted transmission using an asymmetric key (such as PKI) or a symmetric key (such as TLS) to name a few. The one or more third-parties may monitor the second designated public address (and/or other public addresses associated with the issuance of the digital asset tokens) continuously, in substantially real time, at predetermined intervals, and/or aperiodically when requested, to name a few. If the third-party computer system(s) detect a published transaction associated with the second designated public address, for example, the third-party computer system(s) may generate and send a notification to the administrator. The notification in embodiments, may include information associated with the detected activity (e.g., transaction ID, first user public address, first user public address, amount of digital asset deposited, type of digital asset deposited, instructions regarding wrapping of the digital asset, and/or a timestamp associated with the deposit of digital asset, to name a few). In embodiments, the transmission would be via a secure transmission channel, such as an encrypted transmission using an asymmetric key (such as PKI) or a symmetric key (such as TLS) to name a few.

In embodiments, the deposit of the first amount of the first digital asset into the second designated public address may trigger action from the administrator computer system. Continuing the example, the detection of the deposit of 10 FILECOIN into the second designated public address may trigger the administrator system, to transfer a first portion (e.g., the Second Amount of First Digital Asset 11738, such as 9 FILECOIN) of the deposited amount (e.g., 10 FILECOIN) into a reserve (e.g., reserve public address 11732 for reserve(s) 11734, to name a few) and a second portion (e.g., the Third Amount of First Digital Asset 11740, such as 1 FILECOIN) of the deposited amount (e.g., 10 FILECOIN) into an administration account (e.g., Second Exchange Public Address 11730) associated with an administrator (e.g., digital asset exchange computer system 6102, administrator system 6801, and/or administrator system 1801, to name a few). In embodiments, the administration account may be used to pay for fees associated with the administration of the stable value token system and network. In embodiments, the transfers may be performed in a single step, or include multiple transfer steps. In embodiments, the deposited amount of digital assets may be made into a single public address, two public addresses, or more than two public addresses, to name a few. In embodiments, the deposit may trigger three transfers—a first transfer of a first portion (e.g., the Second Amount of First Digital Asset 11738, such as 8 FILECOIN) of the deposited amount (e.g. 10 FILECOIN) into a reserve (e.g., reserve public address 11732 for reserve(s) 11734, to name a few), a second portion (e.g., the Third Amount of First Digital Asset 11740, such as 1

FILECOIN) of the deposited amount (e.g., 10 FILECOIN) into an administration account (e.g., Second Exchange Public Address 11730) associated with an administrator (e.g., digital asset exchange computer system 6102, administrator system 6801, and/or administrator system 1801, to name a few), and a third portion to one or more miner addresses to account for fees associated with the transaction request.

In embodiments, where a reserve public address is used, the reserve transfer may collateralize wrapped tokens (e.g., EFIL on the ETHER network collateralized by FILECOIN on the FILECOIN network) associated with the deposited digital asset (e.g., 9 of 10 FILECOIN deposited). In embodiments, the transfer into the third public address may be associated with one or more fees (e.g., 1 of 10 FILECOIN) for wrapping the digital asset. In embodiments, the transfer into one or more miner addresses to account for fees associated with the storage and/or retrieval instructions. For example, in embodiments a fee in the form of GAS or another token may be included in the digitally signed message.

Continuing with the example, in embodiments, the administrator system may generate a transaction request including instructions to transfer a first portion (e.g., the Second Amount of First Digital Asset 11738, such as 9 FILECOIN) of the deposited amount (e.g. 10 FILECOIN) into a reserve (e.g., reserve public address 11732 for reserve(s) 11734, to name a few) and a second portion (e.g., the Third Amount of First Digital Asset 11740, such as 1 FILECOIN) of the deposited amount (e.g., 10 FILECOIN) into an administration account (e.g., Second Exchange Public Address 11730) associated with an administrator (e.g., digital asset exchange computer system 6102, administrator system 6801, and/or administrator system 1801, to name a few). In embodiments, the administration account may be used to pay for fees associated with the administration of the stable value token system and network. In embodiments, the transfers may be performed in a single step, or include multiple transfer steps. In embodiments, the deposited amount of digital assets may be made into a single public address, two public addresses, or more than two public addresses, to name a few. In embodiments, the transaction request (and/or one or more transaction requests) may include requests for three transfers—a first transfer of a first portion (e.g., the Second Amount of First Digital Asset 11738, such as 8 FILECOIN) of the deposited amount (e.g. 10 FILECOIN) into a reserve (e.g., reserve public address 11732 for reserve(s) 11734, to name a few), a second portion (e.g., the Third Amount of First Digital Asset 11740, such as 1 FILECOIN) of the deposited amount (e.g., 10 FILECOIN) into an administration account (e.g., Second Exchange Public Address 11730) associated with an administrator (e.g., digital asset exchange computer system 6102, administrator system 6801, and/or administrator system 1801, to name a few), and a third portion to one or more miner addresses to account for fees associated with the transaction request.

Referring to FIG. 117B-2 at time T2, the reserve (e.g., the reserve public address 11732 and/or the reserve(s) 11734) and/or an administrator public address on the second blockchain and associated with the administrator (e.g., second exchange public address 11730) may be monitored by (and/or on behalf of) the administrator. Upon determining a transfer was made into the reserve and/or administrator public address, the administrator may, in embodiments, be triggered to automatically (and/or periodically) update a transaction ledger (e.g., electronic ledger computer system 5158 and/or transaction ledger 115) to account for the deposits into one or more of: the second designated public address, the reserves, and/or the administrator public address, to name a few (e.g., Update Electronic Ledger 11744). In embodiments, upon determining the transfer was made, the administrator may obtain information associated with the deposit into one or more of: the first designated public address, the reserves, and/or the third public address, to name a few (e.g., Obtain Transaction Information 11742). The transaction information (e.g., obtain transaction information 11742), may include information indicating one or more of: the amount of the deposit, a request to generate the stable value token (e.g., wrap the first digital asset), a transaction ID, and/or information sufficient to identify the first user, to name a few. Continuing the example, the transaction information may indicate the initial deposit of 10 FILECOIN, a request to wrap the 9 FILECOIN (assuming the fee is taken into account), a transaction ID, and information indicating the deposit was made by the first user.

Referring to FIG. 117B-3 at time T3, the transaction information, in embodiments, may be utilized by the administrator system to generate a second transaction request (e.g., Second Transaction Request 11746). The second transaction request, in embodiments, may include instructions to issue digital asset tokens (e.g., EFIL) in the form of stable value tokens (e.g., the Fourth Amount of First Digital Asset 11748) on a first blockchain underlying the stable value token (e.g., First Blockchain 11712) and collateralized by digital assets held in a reserve (e.g., reserve public address 11732 and/or reserve(s) 11734, to name a few) on the second blockchain (e.g., Second Blockchain 11726). Continuing the example, the administrator may generate a transaction request including instructions to the first blockchain to issue stable value tokens (e.g., wrapped tokens) to designated public address (e.g., first user public address 11720) and/or a public address associated with the first user on a first blockchain (e.g., first blockchain 11712). In embodiments, each of the issued tokens on the first blockchain are collateralized by digital assets (e.g., the Second Amount of Second Digital Asset 11738 (e.g., 9 FILECOIN) held in the reserve public address 11732 and/or reserve(s) 11734) held in the reserve account on the second blockchain (e.g., second blockchain 11726). The instructions, in embodiments, may include information based on the obtained transaction information. In embodiments, the instructions may include a message which may be encrypted and/or digitally signed by one or more private key (or keys) associated with one or more smart contracts associated with the stable value token on the first blockchain (e.g., First Smart Contract 11714A, Second Smart Contract 11716A, and/or Third Smart Contract 11718A, to name a few). In embodiments, the instructions may be encrypted and/or digitally signed by one or more private key (or keys) associated with one or more smart contracts associated with the stable value token on the first blockchain (e.g., First Smart Contract 11714A, Second Smart Contract 11716A, and/or Third Smart Contract 11718A, to name a few).

Continuing the example, the issued stable value digital asset token on the first blockchain (e.g., the ETHEREUM Blockchain) may be associated with transaction information stored in the blockchain indicating the transaction information associated with the deposit on the second blockchain (e.g., the FILECOIN Blockchain) to the Second User Public Address 11728 and/or the Reserve Public Address 11732 as evidence of collateral for the issued stable value digital asset token. The generated second transaction request (e.g., second transaction request 11746), in embodiments, may be published to the contract address(es) associated with the issuance of stable value tokens by the administrator on the first blockchain (e.g., the first blockchain 11712). In embodiments, such publication may involve sending a message that is digitally signed by the private key (or keys) associated with the administrator and/or the contract address(es) associated with the stable value token. The message, in embodiments, may include the embedded information. The published transaction request, in embodiments, may trigger action from one or more smart contracts associated with the stable value token (e.g., first smart contract 11714A, second smart contract 11716A, and/or third smart contract 11718A, to name a few).

Continuing the example, the published second transaction request may be verified by the one or more smart contracts associated with the stable value token, based at least in part on the digital signature. The one or more smart contracts, continuing the example, may issue digital asset tokens (e.g., the fourth amount of second digital asset 11748) collateralized by the 10 FILECOIN (and/or the portion of the 10 FILECOIN transferred into the reserve public address 11732) into a second designated public address (e.g., first user public address 11720) on the first blockchain (e.g., the ETHERIUM blockchain). The issued stable value tokens, in embodiments, may be the generated and wrap the transferred first amount of first digital asset on the second blockchain (e.g., FILECOIN on the FILECOIN Network) as requested by the first user (and/or user). The execution of the second transaction request, in embodiments, may be confirmed by the administrator computer system (e.g., by sending a call to the first designated public address to confirm the deposit of the newly 'minted' tokens, and/or by monitoring the first blockchain to determine if the newly minted stable value tokens are available at the first designated public address (e.g., first user public address 11720)). In embodiments, stable value tokens may be minted or generated for more than one first user at the same time without departing from the letter or spirit of the invention.

In embodiments, the stable value digital asset tokens may be issued to a public address associated with the first user. Alternatively, in embodiments, once issued, the stable value digital asset tokens may be issued to a depository which in turn transfers the stable value digital asset tokens to a public address associated with the first user. Continuing the example, the administrator may be authorized to transfer the issued digital asset tokens from the second designated public address to another public address on the first blockchain. In embodiments, the second designated public address may be a public address associated with the administrator and may correspond to one or more private keys or keys sets associated with that public address and held by the administrator or its agent. Continuing the example, the administrator may generate and publish a transaction request (e.g., Third Transaction Request 11750) including instructions to transfer the stable value digital asset tokens (e.g., the fourth amount of second digital asset 11748) representing the initial deposit of 10 FILECOIN (or 9 FIL to account for the fees in this example) to a public address on the first blockchain associated with the first user or to any other public address on the first blockchain desired by the first user (e.g., a customer preference and/or identified public address on the first blockchain). In embodiments, such publication will involve sending a message that is digitally signed by the private key (or keys) associated with the first e.g., user public address 11720 on the first blockchain (the ETHEREUM blockchain), and include, as a recipient, at least the other public address of the recipient.

In embodiments, one or more users and/or users may unwrap and burn digital assets on the first blockchain (e.g., EFIL tokens on the ETHER network), the digital assets to be unwrapped and burned being pegged to a fixed ratio of another digital asset on the second blockchain (e.g., FILECOIN on the FILECOIN network), such as, by unwrapping one or more digital assets for the purpose of redeeming the wrapped digital asset tokens for the first digital asset on the second blockchain (e.g., second blockchain 11726). In other words, users and/or users may return the stable value token (e.g., EFIL) on the first blockchain (the ETHER network), in exchange for the first digital asset (e.g., FILECOIN) on the second blockchain (e.g., the FILECOIN blockchain). As noted, this process is referred to as unwrapping the stable value token.

Continuing the example, the first user (and/or first user) may want to burn the digital asset tokens representing the initial deposit of 10 FILECOIN (and/or a portion of the 10 FILECOIN transferred to the reserve(s), e.g., 9 FILECOIN in the example). In such embodiments, the first user may send an electronic request to an administrator system. In embodiments, such a request may be via a secure channel, such as an encrypted communication. For example, the communication may be using an asymmetric key, such as a PKI key, or using a symmetric key, such as used in TLS, to name a few. The communication, in embodiments, may be encrypted by the sender (e.g., a first user device and/or first user device) and/or the recipient (e.g., a first user device and/or administrator system), to name a few. The first user, (e.g., the first e.g., user device(s) 11704), may be authorized (e.g., by an administrator) to burn the stable value token (e.g., EFIL). In embodiments, to initiate this unwrapping process, in embodiments, the first user may send a request, including instructions to unwrap and/or burn the digital asset tokens representing the initial deposit of a fixed number of stable value tokens (e.g., 10 EFIL tokens) to the first user (e.g., the first e.g., user device(s) 11704). In embodiments, such a request would be via a secure channel, such as an encrypted communication. For example, the communication may be using an asymmetric key, such as a PKI key, or using a symmetric key, such as used in TLS, to name a few. The communication, in embodiments, may be encrypted by sender and/or the first user device and/or an administrator (e.g., the digital asset exchange computer system 6102).

In response to a request, which may be made via a secure channel, the first user device (e.g., the first e.g., user device(s) 11704) and/or an administrator (e.g., the digital asset exchange computer system 6102), may generate and/or provide an Intent to Burn Public Address 11724 (that may be associated with the first user and/or otherwise available for customers). A more detailed explanation of the generation of an Intent to Burn public address (e.g., a designated address on the first blockchain 11712) is located below in connection with the description of FIG. 118, the description of which applying herein. Continuing the example, the request may also include an identification of the Second User Public Address 11728 on the Second Blockchain (e.g., the FILECOIN blockchain) at which the unwrapped digital assets (e.g., the FILECOIN) are to be received. In embodiments, the Second User Public Address 11728 may be already known to the first user device and/or the administrator, and thus not necessary to be included in the request.

Unwrapping and burning a digital asset token, in embodiments referring to FIG. 117C-1 at time T1', may require a first user device (e.g., first user device(s) 11704) to deposit a first amount of a stable value digital asset token (e.g., the Fifth Amount of Second Digital Asset 11754) into a third designated public address (e.g., Intent to Burn Public Address 11724) on the first blockchain (e.g., first blockchain 11712). To transfer the first amount of digital asset, the first user device may generate and publish a transaction request (e.g., the Fourth Transaction Request 11752) to the first blockchain 11712. The transaction request, in embodiments, may be digitally signed by the first user device (e.g., first user device(s) 11704) and/or digitally signed by the first user device and the administrator system (e.g., via MPC), to name a few. Continuing the example, the first user device may transfer the stable value digital asset tokens into a designated public address—intent to burn public address (e.g., by generating and publishing the Fourth Transaction Request 11752). The deposit of the first amount of the stable value digital asset token into the designated public address (e.g., the First user Public Address 11720 and/or the Intent to Burn Public Address 11724), in embodiments, may trigger action from one or more smart contracts (e.g., the first smart contract 11714A, the second smart contract 11716A, and/or the third smart contract 11718B) on the first blockchain (e.g., first blockchain 11712). Continuing the example, the deposit of the stable value digital asset tokens into the designated public address may cause the one or more smart contracts to verify and/or execute the request to burn the digital asset tokens. A more detailed explanation of smart contract instructions and the execution of one or more transaction requests is located below in connection with FIGS. 119A-1, 119A-2, 119B-1, and 119B-2, then descriptions of which applying herein. The execution of the request to burn, in embodiments, may result in the burning of the digital asset tokens. In embodiments, burning digital asset tokens may include transferring a portion of the digital asset tokens to a public address associated with the administrator (e.g., First Exchange Public Address 11722). The portion, in embodiments, may represent one or more fees associated with burning digital asset tokens.

Referring to FIG. 117C-2 at time T2', in embodiments, the designated address (first user public address 11720, first exchange public address 11722, and/or intent to burn public address 11724) may be monitored by (and/or on behalf of) the administrator. The administrator, in embodiments, may monitor the designated public address continuously, in substantially real time, at predetermined intervals (e.g., at the end of a business day, every hour, twice a day, etc.), and/or aperiodically when requested, to name a few. In embodiments, the administrator may employ one or more third-parties (e.g., one or more watchtower systems) to monitor the designated public address (and/or other public addresses associated with the issuance and/or burning of the digital asset tokens and/or digital assets) for any activity (e.g., a published transaction, a published message, a published transaction intent, to name a few). To enable a third-party to monitor the designated public address (and/or other public addresses associated with the issuance of the digital asset tokens), the administrator may generate and transmit monitoring information to a third-party computer system associated with the one or more third-parties via network 125. In embodiments, the transmission would be via a secure transmission channel, such as an encrypted transmission using an asymmetric key (such as PKI) or a symmetric key (such as TLS) to name a few. The one or more third-parties may monitor the designated public address (and/or other public addresses associated with the burning of the digital asset tokens) continuously, in substantially real time, at predetermined intervals, and/or aperiodically when requested, to name a few. If the third-party computer system(s) detect a published transaction associated with the designated public address, for example, the third-party computer system(s) may generate and send a notification to the administrator. The notification in embodiments, may include information associated with the detected activity (e.g., transaction ID, first user public address, first user public address, amount of digital asset deposited, type of digital asset deposited, instructions regarding unwrapping of the digital asset, and/or a timestamp associated with the deposit of stable value digital asset token, to name a few). In embodiments, the transmission would be via a secure transmission channel, such as an encrypted transmission using an asymmetric key (such as PKI) or a symmetric key (such as TLS) to name a few.

Upon determining a transfer was made into the designated public address, the administrator may, in embodiments, be triggered to automatically update a transaction ledger (e.g., electronic ledger computer system 5158 and/or transaction ledger 115) to account for the deposits into one or more of: the designated public address and/or the administrator public address, to name a few (e.g., Update Electronic Ledger 11758). Continuing the example, the administrator may update (e.g., Update Electronic Ledger 11758) a transaction ledger (e.g., electronic ledger computer system 5158 and/or transaction ledger 115) to account for the request to burn the digital asset tokens and/or the execution of the request to burn the digital asset tokens. In embodiments, upon determining the transfer was made, the administrator may obtain information associated with the deposit into one or more of: the designated public address and/or the administrator public address, to name a few (e.g., Obtain Transaction Information 11756). The transaction information (e.g., obtain transaction information 11756), may include information indicating one or more of: the amount of the deposit, a request to burn the digital asset tokens, a transaction ID, and/or information sufficient to identify the first user, to name a few. Continuing the example, the transaction information may indicate the deposit of the digital asset tokens, the request to burn the digital asset tokens, a transaction ID, and information indicating the deposit was made by the first user.

Referring to FIG. 117C-3 at T3', the transaction information, in embodiments, may be utilized by the administrator to generate a transaction request for the second blockchain (e.g., Fifth Transaction Request 11760). Continuing the example, the detection of the deposit into the designated public address on the first blockchain (e.g., the intent to burn public address 11724) may trigger the administrator system, the one or more smart contracts, to transfer, from a public address (e.g., reserve public address 11732), a first portion (e.g., the Sixth Amount of First Digital Asset 11764, such as 9 FILECOIN) of the wrapped deposited amount (e.g., 10 FILECOIN) into a designated public address (e.g., second entity public address 11728) and a second portion (e.g., the Seventh Amount of First Digital Asset 11768, such as 1 FILECOIN) of the wrapped deposited amount (e.g., 10 FILECOIN) into an administration account (e.g., Second Exchange Public Address 11730) associated with an administrator (e.g., digital asset exchange computer system 6102, administrator system 6801, and/or administrator system 1801, to name a few). In embodiments, the administration account may be used to pay for fees associated with the administration of the stable value token system and network. In embodiments, the transfers may be performed in a single step, or include multiple transfer steps. In embodiments, the deposited amount of digital assets may be made into a single public address, two public addresses, or more than two public addresses, to name a few. In embodiments, the deposit may trigger three transfers—a first transfer of a first portion (e.g., the Sixth Amount of First Digital Asset 11764, such as 8 FILECOIN) of the wrapped deposited amount (e.g. 10 FILECOIN) into a reserve (e.g., reserve public address 11732 for reserve(s) 11734, to name a few), a second portion (e.g., the Seventh Amount of First Digital Asset 11768, such as 1 FILECOIN) of the wrapped deposited amount (e.g., 10 EFIL) into an administration account (e.g., Second Exchange Public Address 11730) associated with an administrator (e.g., digital asset exchange computer system 6102, administrator system 6801, and/or administrator system 1801, to name a few), and a third portion (e.g., of the wrapped deposited amount) to one or more miner addresses to account for fees associated with the transaction request.

In embodiments, the detection of the deposit into the designated public address on the first blockchain (e.g., the intent to burn public address 11724) may trigger the administrator system to generate a transaction request (e.g., fifth transaction request 11760). The transaction request, which may be digitally signed by the administrator computer system (e.g., digital asset exchange computer system 6102), may include instructions to transfer, from a public address (e.g., reserve public address 11732), a first portion (e.g., the Sixth Amount of First Digital Asset 11764, such as 9 FILECOIN) of the wrapped deposited amount (e.g., 10 FILECOIN) into a designated public address (e.g., second user public address 11728) and a second portion (e.g., the Seventh Amount of First Digital Asset 11768, such as 1 FILECOIN) of the wrapped deposited amount (e.g., 10 FILECOIN) into an administration account (e.g., Second Exchange Public Address 11730) associated with an administrator (e.g., digital asset exchange computer system 6102, administrator system 6801, and/or administrator system 1801, to name a few). In embodiments, the administration account may be used to pay for fees associated with the administration of the stable value token system and network. In embodiments, the transfers may be performed in a single step, or include multiple transfer steps. In embodiments, the deposited amount of digital assets may be made into a single public address, two public addresses, or more than two public addresses, to name a few. In embodiments, the deposit may trigger three transfers—a first transfer of a first portion (e.g., the Sixth Amount of First Digital Asset 11764, such as 8 FILECOIN) of the wrapped deposited amount (e.g. 10 FILECOIN) into a reserve (e.g., reserve public address 11732 for reserve(s) 11734, to name a few), a second portion (e.g., the Seventh Amount of First Digital Asset 11768, such as 1 FILECOIN) of the wrapped deposited amount (e.g., 10 EFIL) into an administration account (e.g., Second Exchange Public Address 11730) associated with an administrator (e.g., digital asset exchange computer system 6102, administrator system 6801, and/or administrator system 1801, to name a few), and a third portion (e.g., of the wrapped deposited amount) to one or more miner addresses to account for fees associated with the transaction request.

The generated third transaction request (e.g., fifth transaction request 11760), in embodiments, may be published by the administrator on the second blockchain, where the transaction request may be verified (e.g., the digital signature of the administrator computer system may be verified by one or more smart contract(s)). The published transaction request, in embodiments, may trigger action from one or more smart contracts (e.g., the first smart contract 11714A, the second smart contract 11716A, and/or the third smart contract 11718A) on the first blockchain. In embodiments, such a request may be via a secure channel, such as an encrypted communication. For example, the communication may be using an asymmetric key, such as a PKI key, or using a symmetric key, such as used in TLS, to name a few. The communication, in embodiments, may be encrypted by a first user device and/or an administrator (e.g., the digital asset exchange computer system 6102).

Once transferred, in embodiments, the first digital asset on the second blockchain may be obtained by a first user device (and/or first user device) by generating and publishing a transaction request (e.g., Sixth Transaction Request 11766) to the second blockchain. The transaction request, in embodiments, may include instructions to transfer the amount of digital asset (e.g., the sixth amount of first digital asset) held in the second user public address 11728 to an additional public address on the second blockchain and be digitally signed by one or more private keys associated with the second user public address 11728. Continuing the example, the first user may be authorized to transfer the 10 FILECOIN (and/or the first portion of 10 FILECOIN) from the designated public address (e.g., second user public address 11728) to another public address on the second blockchain (e.g., associated with the first user device and/or the first user device). In embodiments, the designated public address may be a public address associated with the first user.

Example Workflow

In embodiments, an exemplary workflow may be used to implement the claimed process and system. Workflow data, like account and current state, may be saved by the administrator system in a wrapping system database operatively connected to the administrator system. In embodiments, when the administrator system receives a request, observes via a monitoring process triggering event, or detects or receives an event, the system will transition into the next workflow state. The following pseudocode illustrates an exemplary structure of such detection and transition:

```
Blockchain Monitor
consume block, notice relevant transaction
trigger event(tx_id, from, to, amount, . . . ) to wrapping service
Wrapping System
receive event( ) from blockchain monitor - lookup workflow related to event( )
alert if workflow cannot be found (ex: unrecognized burn) - execute transition actions
transition event's workflow to next state
call relevant workflow functions on network adapter - alert on failure
update workflow's current state
log transition: workflow_id, from state, to state, timestamp - mark workflow as complete if
final state reached
```

In accordance with this exemplary structure, as discussed below, states and transitions associated with minting and burning operation are defined.

In embodiments, the administrator system may include various software declaratory codes, known as adapters, that may be called and run as part of the process.

By way of illustration, in the example of wrapping system where the first digital asset being wrapped is FILECOIN, and the underlying digital asset for the stable value token is Ethereum, the following adapters may be included on the administrator system:

Filecoin Adapter generateMintAddress( ): This function requests the Filecoin wallet to generate a new minter deposit address. It returns the address for the wrapping service to store and associate with future merchant mint deposits and workflows.

transferToReserveAddress( ): This function accepts the cid of the funding message, the source of the funds (the merchant's minting address), the to address (the FIL reserve account), the sweep amount, and the fee amount. The function generates two transaction intents, one in the amount of the fee to be sent to the fee depository address, the second transaction sends the specified sweep amount to the FIL reserve address.

payoutFromReserveAddress( ): This function accepts the withdrawal id, the source of the funds (the FILL reserve address), the payout amount, and the destination address (the merchant's payout address). The function generates a transaction to send the funds from the FIL reserve address to the merchant's FIL payout address.

Ethereum Adapter generateUnwrapAddress( ): This function establishes an address in the Ethereum wallet. It returns the address for the wrapping service to store and associate with future merchant unwrap deposits and workflows.

mintWrappedAsset( ): This function accepts some minting intent id, the minter's payout address and the amount of the wrapped asset to be minted, and the smart contract address to do the minting. The function generates an ethereum transaction to the minting smart contract specified, calling the mint function on the contract with the amount provided, allocating the minted tokens to the payout address provided.

transferToBurnAddress( ): This function accepts the burner's unwrap address and the amount of the wrapped asset to be burned. It generates an Ethereum transaction that transfers the eFIL from the burner's unwrap address to the house intent to burn address.

In embodiments, other and additional adapters could also be used. In embodiments, in which the first digital asset is another digital asset besides FILECOIN, the adapters may be modified to accommodate the appropriate implementation of commands as necessary to adapt to such blockchain without departing from the spirit of the present invention. In embodiments, in which the underlying digital asset for the stable value token is another digital asset besides ETHER, the adapters may be modified to accommodate the appropriate implementation of commands as necessary to adapt to such blockchain without departing from the spirit of the present invention.

Minting Workflow

Minting is the act of accepting a first digital asset (in this example FILECOIN) transfer on the first digital asset blockchain (in this example on the FILECOIN blackchain), increasing the circulating supply of a stable value token (in this example, eFIL ERC-20 token) by the deposited amount less fees, then sending that increased supply of stable value tokens to the address provided by the depositor. In embodiments, an exemplary workflow may include the following series of states and transitions:

State 0 Workflow initialized

This state is established when an event is received that is not recognized by the wrapping system. The deposit establishes the zero state and immediately transitions to the next state.

| |
|---|
| Event: the blockchain monitor notifies the wrapping system of a finalized merchant minting address deposit<br>Transition: FilecoinAdapter-t ransferToReserveAddress( ): |

The wrapping system calls sweepMintingDeposit on the FIL adapter to collect the minting fee and sweep the deposit to the FIL reserve.

State 1 Forwarded Minting Deposit

This is the first in-flight workflow state. It represents the system waiting for the sweep from the minter's deposit address to the FIL reserve account.

| |
|---|
| Event: the blockchain monitor notifies the wrapping system of a finalized FIL reserve sweep transaction<br>Transition: WrappingSystem-updateLedger( ) |

The wrapping system updates the reserve account's ledger balance to reflect the deposited filecoin.

State 2 Payable eFIL Ledger Balance

This state reflects the need to payout the eFIL we owe the minter. Upon the successful completion of the ledger update transition, we issue a transaction to the Ethereum network adapter to mint new eFIL and allocate the balance to the minter

| |
|---|
| Event: the wrapping system's ledger update is successful<br>Transition: EthereumAdapter-mintWrappedAsset( ) |

The wrapping system executes a function on the ethereum network adapter to generate an ethereum transaction calling the minting function on the specified minting smart contract, in this case eFIL.

State 3 Verified eFIL Payout

This state reflects the wrapping system waiting for the finalization of the ethereum transaction that issued the token to the minter.

| |
|---|
| Event: the blockchain monitor notifies the wrapping service of a finalized minter payout transaction<br>Transition: WrappingSystem-complete Workflow( ) |

The wrapping system considers the minting process complete

Burning Workflow

Burning is the act of accepting a eFIL deposit at a Gemini address on the Ethereum network, destroying the tokens deposited, and sending proportional filecoin less fees from the Gemini custody account to the depositors provided Filecoin address.

State 0 Initialized Workflow

This state is established when an event is received that is not recognized by the wrapping system. The unwrap deposit establishes the zero state and immediately transitions to the next state.

| |
|---|
| Event: the blockchain monitor notifies the wrapping system of a finalized merchant unwrap address deposit<br>Transition: EthereumAdapter-transferToBurnAddress( ) |

The wrapping system transfers the funds present on the merchant's unwrap address to the house burn address.

State 2 Finalized Burn Deposit

This state is established when an event is received by the blockchain monitor notifying the wrapping service that there has been a deposit on the burn address. This indicates to the wrapping service that it's able to proceed with the FIL payout.

| |
|---|
| Event: the blockchain monitor notifies the wrapping system of a finalized burn address deposit<br>Transition: WrappingService-updateLedger( ) |

The wrapping system deducts the balance of the burn address deposit, less fees.

State 3 Payable FIL Ledger Balance

The workflow reaches this state after we've successfully deducted the eFIL ledger balance by the amount of the burn address deposit, less fees. We now need to issue a payout transaction from the reserve to the associated merchant payout address.

| |
|---|
| Event: the wrapping service successfully updates the ledger<br>Transition: FilecoinAdapter-payoutFromReserveAddress( ) |

The wrapping system executes the payoutFromReserveAddress( ) function on the Filecoin adapter to tell the Filecoin wallet to generate two transactions from the reserve address, one to the merchant FIL payout address in the amount of unwrapped eFIL less fees, and the second to the fee depository in the amount of the fees deducted.

State 4 Verified FIL Payout

After the payout has been broadcast and finalized at the merchant's FIL payout address, we can consider the workflow completed.

| |
|---|
| Event: the blockchain monitor notifies the wrapping service of a finalized transaction at the merchant's payout address.<br>Transition: WrappingSystem-completeWorkflow( ) |

FIGS. 119A, 119A-1, and 119A-2, are flowcharts illustrating exemplary processes for issuing a first digital asset on a first underlying blockchain where each issued first digital asset is backed by collateral on a second blockchain. Referring to FIG. 119A, an exemplary process for issuing a first digital asset on a first blockchain backed by a currency is shown. For the purposes of this example, the currency backing the first digital asset on the first blockchain is a second digital asset on a second blockchain. In embodiments, the currency may refer to fiat and/or a combination of flat and digital asset. As noted above, an exemplary system for issuing and/or burning a first digital asset on a first underlying blockchain, each issued first digital asset backed by collateral (e.g., fiat and/or a second digital asset) on a second blockchain, is illustrated in connection with FIGS. 117A, 117A-1-117A-3, and 117B-1-117B-3 (collectively "FIG. 117"), the descriptions of the systems and components therein applying herein.

In embodiments, the process may begin at step S11902A. At step S11902A, in embodiments, and digital asset exchange (and/or a first user, digital asset token issuer, and/or administrator, to name a few) may authenticate a first user device associated with a first user. For example, a first user, via a corresponding first user device, may generate and send an authentication request to the digital asset exchange computer system. In embodiments, the authentication request may be made from a smart phone application. The authentication request, in embodiments and as described above, may include credential information associated with the first user, which, in embodiments, may include one or more of the following: a username and password combination; biometric data associated with the first user (e.g., finger print, facial recognition identification, voice print, retinal scan, palm print, and/or a combination thereof, to name a few); personally identifiable information ("PII") associated with the first user; a telephone phone number associated with the first user (e.g., a mobile phone associated with the user device); a social security number associated with the first user; an e-mail address associated with the first user; an electronic mail address, a partial social security number, a government issued identification number, a shape, access card scan (e.g., swipe of a card associated with the exchange and having a magnetic strip), a pin (e.g., a number provided via SMS, other text message service, or email for multi-factor authentication), and/or a code, to name a few.

Continuing the example, the digital asset exchange computer system may verify the authentication request (e.g., verify the received user login credentials). In embodiments, verifying the first user's authentication request may include comparing the received login credentials with verified login credentials (e.g., credentials created by the first user and stored in memory 6102-C and/or memory 5302-C). If the authentication request is not verified, in embodiments, administrator computer system may generate and send a notification indicating the received authentication request was denied which may include information indicating one or more reasons the received authentication request was denied (e.g., incorrect password, unregistered device, time elapsing before a two-factor authentication request is completed, to name a few). In embodiments, the authentication request may be verified. In embodiments, the digital asset exchange computer system may utilize one or more protocols and/or programs to verify the authentication request (e.g., for security purposes). For example, the administrator computer system may utilize one or more of: encryption, point-to-point encryption, two-factor authentication, tokenization, login credentials, and/or a combination thereof, to name a few.

As described in connection with FIGS. 119A, 119A-1, 119A-2, 119B, 119B-1, and 119B-2, each message sent and/or received in embodiments, may be encrypted communication. The communication may be encrypted by the sender and/or receiver of the message, in embodiments. Similarly, each message may be sent and/or received via a secure channel, such as an encrypted communication. For example, each message may be using an asymmetric key, such as a PKI key, or using a symmetric key, such as used in TLS, to name a few. Each message, in embodiments, may be encrypted by a sender and/or receiver of the message (e.g., first user device and/or digital asset exchange computer system). Similarly, each transaction request, in embodiments, may be digitally signed by the digital asset exchange computer system (e.g., using a private key associated with the digital asset exchange computer system system) and/or digitally signed by the digital asset exchange computer system and the first user device (e.g., via MPC). In embodiments, each instruction included within each transaction request may be encrypted and/or digitally signed using one or more private keys associated with the digital asset exchange computer system (and/or the First user device(s)). In embodiments, such a request and/or message may be via a secure channel, such as an encrypted communication. For example, the communication may be using an asymmetric key, such as a PKI key, or using a symmetric key, such as used in TLS, to name a few. The communication, in embodiments, may be encrypted by a first user device and/or an administrator (e.g., the digital asset exchange computer system 6102).

Step S11902A, in embodiments, may be similar to the authentication processes described in connection with: step S1602 described in connection with FIGS. 16A-16B; step S1702 described in connection with FIGS. 17A-17B; step S4802 as described in connection with FIGS. 48A-48B; step S4902 as described in connection with FIG. 49A; and step S5004 as described in connection with FIG. 50A, the descriptions of each applying herein.

In embodiments, the role of the digital asset exchange computer system in the processes described herein, may, in this context, be played by: a digital asset exchange computer system associated with a digital asset exchange (e.g., digital asset exchange computer system 5302 described in connection with FIGS. 53A-53E and 54A-54C, the descriptions of each applying herein), a digital asset token issuer computer system associated with a digital asset token issuer (e.g., the digital asset token issuer described in connection with FIGS. 39A-39E, FIGS. 14A-14G, the descriptions of each applying herein) and/or an administrator computer system associated with an administrator (e.g., administrator system 6801 described in connection with FIG. 24, the description of which applying herein), to name a few.

In embodiments, one or more first user devices (e.g., first user device 11704 . . . Nth first user device 11704N) associated with one or more users may be a part of the system for wrapping and/or unwrapping digital assets. The first user device 11704 . . . Nth first user device 11704N (hereinafter the "First user device(s)") shown in FIG. 117 and corresponding first user(s) may be associated with issuing and/or burning the second digital asset token on the first blockchain 11712, each issued first digital asset backed by collateral (e.g., the second digital asset) on the second blockchain 11726. In embodiments, each user (and/or First user device(s)) may be on-boarded by the digital asset exchange 6110 via the digital asset exchange computer system 6102 (a more detailed description of which is located above in connection with the description of FIG. 118, the description applying herein). As described in connection with FIG. 118, the on-boarding process of one or more users may include, in embodiments, obtaining one or more public addresses and associated public keys (e.g., the public key associated with the first keyset 11704C-1, the public key associated with the Nth keyset 11704NC-1). For example, one or more users may be associated with one or more public addresses (e.g., referring to FIG. 117B-1 and/or FIG. 117C-1, for example, first user public address 11720, and/or second user public address 11728, to name a few) which may be generated (e.g., by one or more smart contracts and/or one or more adaptors) by the digital asset exchange, retrieved by the respective first user, and/or received from the respective first user. The one or more public addresses may include public addresses for depositing and/or withdrawing one or more digital assets in connection with the processes described in connection with FIGS. 117A, 117B-1, 117B-2, 117B-3, 117C-1, 117C-2, 117C-3, 119A, 119A-1, 119A-2, 119B, 119B-1, and 119B-2, the descriptions of which applying herein. In embodiments, one or more of the aforementioned public addresses may be generated by a multi-party computation (MPC), similar to the MPCs described in below, the description of which applying herein. Referring to FIG. 117A, each of the First user device(s), in embodiments, may include processor(s) (i.e., processor(s) 11704-A, processor(s) 11704N-A), network connection interface(s) (i.e., network connection interface 11704-B, network connection interface 11704N-B), and/or memory (i.e., memory 11704-C, memory 11704N-C), to name a few. In embodiments, the memory of one or more of the First user device(s) may include one or more key sets (e.g., First Keyset 11704-C-1 and/or Nth Keyset 11704N-C-1). Processor(s) 11704-A, and/or processor(s) 11704N-A, as used herein, may be similar to the one or more processor(s) 6104-A described in connection with FIG. 61A, the description of which applying herein. Network connection interface 11704-B and/or network connection interface 11704N-B may be similar to the communication portal 6104-C described in connection with FIG. 61A, the description of which applying herein. Memory 6102-C may be similar to memory 6104-B described in connection with FIG. 61A, the description of which applying herein. The digital asset exchange computer system 6102 may, in embodiments, be a plurality of computers and/or computer systems. In embodiments, the exchange computer system 6102 may further include one or more display screens, which may be similar to the display screen described above, the description of which applying herein. The First user device(s), in embodiments, may be similar to the first user device described in connection with FIG. 60, the description of which applying herein.

The process for issuing a first digital asset on a first blockchain collateralized by a second digital asset on a second blockchain may continue with step S11904A. At step S11904A, in embodiments, the digital asset exchange computer system may receive, from the first user device, a first request to obtain a first digital asset in exchange for a second digital asset. A more detailed description of step S11904A may be described in connection with FIG. 119A-1. Referring to FIG. 119A-1, in embodiments, at step S11904A-1, the digital asset exchange computer system may receive the first request from the first user device. Continuing the example, the first user via an associated first user device may generate and send an electronic request to the digital asset exchange computer system (e.g., digital asset exchange computer system 6102) associated with a digital asset exchange. In embodiments, such a request may be made via a secure channel, such as an encrypted communication. For example, the communication may be encrypted using an asymmetric key, such as a PKI key, or using a symmetric key, such as used in TLS, to name a few. The communication, in embodiments, may be encrypted by the sender (e.g., a first user device associated with the first user) and/or the recipient (e.g., a digital asset exchange computer system computer system associated with a digital asset exchange), to name a few. The digital asset exchange computer system, continuing the example, may receive the electronic request from the first user (e.g., via a corresponding first user device).

The process of receiving the first request, in embodiments, may continue with step S11904A-2. At step S11904A-2, in embodiments, the digital asset exchange computer system may verify the first request. For example, the electronic request may include a request to generate 10 EFIL (i.e., the first digital asset) in exchange for 10 FILECOIN (i.e., the second digital asset). Continuing the example, the digital asset exchange computer system may verify the electronic request by determining whether the first user has sufficient funds (e.g., the 10 FILECOIN) to complete the transaction. The determination of whether the first user has sufficient funds to complete the transaction, in embodiments, may be based on reference to an electronic ledger associated with the administrator computer system (e.g., first transaction ledger 115 and/or second transaction ledger 115-1, to name a few). Sufficient funds, in embodiments, may account for the second amount of the second digital asset and any associated fees with the transaction. For example, the request for the generation of 10EFIL may require a deposit of 11 FILECOINS—10 FILECOINS for collateral and 1 FILECOIN for one or more fee(s) associated with the issuance of 10 EFIL. If the electronic request is not verified, in embodiments, the digital asset exchange computer system may generate and send a notification indicating the electronic request was denied which may include information indicating one or more reasons the received electronic request was denied (e.g., insufficient funds, the first user is not authorized to complete the transaction, to name a few). In embodiments, the electronic request may be verified. In embodiments, the verification of the electronic request may be required to generate a first digital asset (e.g., EFIL) on the first blockchain (e.g., ETHEREUM blockchain) pegged to a second digital asset on a different, second blockchain (e.g., FILECOIN on the FILECOIN network). In embodiments, S11904A-2 may be similar to the description of step S77306, described in connection with FIG. 73A, the description of which applying herein.

The process of receiving the first request, in embodiments, may continue with step S11904A-3. At step S11904A-3, in embodiments, the digital asset exchange computer system may generate a first transaction request which may include first instructions to generate a first designated public address on the second blockchain. In embodiments, in response to the received request (and/or in response to a verified received electronic request), in embodiments, the digital asset exchange computer system may generate a designated address on the second blockchain (e.g., FILECOIN network, second blockchain 11726, to name a few). For example, the digital asset exchange computer system may generate the first transaction request including the request to generate a public address. The transaction request, in embodiments, may be digitally signed by the administrator computer system based on a private key associated with the administrator. At step S11904A-4, in embodiments, the generated transaction request, may be published by the digital asset computer system via the second blockchain 11726 to a second plurality of geographically distributed computer systems associated with the second blockchain 11726. Once published, the transaction request, in embodiments, may be verified and/or executed by the second plurality of geographically distributed computer systems, resulting in the generation of a public address on the second blockchain 11726—e.g., the first designated public address. The generated first designated public address, in embodiments, may be one or more public addresses where digital assets to be wrapped are deposited. In embodiments, as described above, the designated public address may have already been generated by the digital asset exchange (e.g., during an on-boarding process such as the process described in connection with FIG. 118). The first designated public address, in embodiments, may be associated with a key pair including a public and private key (which may be mathematically related to one another). The key pair, in embodiments, may be stored by the administrator computer system (e.g., in memory 6102-C). In embodiments, the first designated public address may be generated as part of the on-boarding process described in connection with FIG. 118, the description of which applying herein.

The process of receiving the first request, in embodiments, may continue with step S11904A-5. At step S11904A-5, in embodiments, the digital asset exchange computer system may obtain first designated public address information (e.g., information indicating the first designated public address, the first designated key pair, the first user, a public address associated with the first user, and/or a combination thereof, to name a few). For example, the digital asset exchange computer system may generate and send a call to the second blockchain to confirm the execution of the first transaction request. The second blockchain, in embodiments, may return first designated public address information which may be obtained and stored by the digital asset exchange computer system. In embodiments, a third-party computer system may monitor the second blockchain to confirm the execution of the first transaction request. The third-party computer system, in such embodiments, may notify the digital asset exchange computer system of the execution of the first transaction request and/or obtain and send, to the digital asset exchange computer system, the first designated public address information. In embodiments, such a notification or message including the first designated public address information may be made via a secure channel, such as an encrypted communication. For example, the communication may be encrypted using an asymmetric key, such as a PKI key, or using a symmetric key, such as used in TLS, to name a few. The communication, in embodiments, may be encrypted by the sender (e.g., the third-party computer system) and/or the recipient (e.g., the digital asset exchange computer system), to name a few.

The process of receiving the first request, in embodiments, may continue with step S11904A-6. At step S11904A-6, in embodiments, the digital asset exchange computer system may generate a first message including instructions to transfer the second amount of the second digital asset to the first designated public address. The first message, in embodiments, may include machine-executable instructions which, when executed, display information on the first user device that indicates instructions to transfer the second amount of the second digital asset to the first designated public address. In embodiments, continuing the above example, the digital asset exchange computer system may generate an electronic response to the first user's electronic request. The electronic response, in embodiments, may include instructions on how to transfer the first amount of second digital asset (e.g., 10 FILECOIN from a public address on the second blockchain to the second user public address 11728 on the second blockchain). For example, the electronic response may include information sufficient to indicate that the first user is to deposit the first amount of second digital asset into the first designated public address, which may be, in embodiments, represented by one or more of an alpha-numeric public address, and/or a QR code representation of the alpha-numeric public address, to name a few. In embodiments, such a message may be sent via a secure channel, such as an encrypted communication. For example, the message may be encrypted using an asymmetric key, such as a PKI key, and/or using a symmetric key, such as used in TLS, to name a few. The message, in embodiments, may be encrypted by the sender (e.g., the digital asset exchange computer system) and/or the recipient (e.g., the first user device), to name a few. In embodiments, where, prior to the electronic request, the first user already has access to information indicating the first designated public address, it may not be necessary for the first user device to communicate with the digital asset exchange computer system (e.g., the electronic request) prior to depositing the first amount of the second digital asset into the first designated public address. Alternatively, in embodiments, the first user can instead transfer the desired amount of digital asset to be wrapped directly to the first designated public address. At step S11904A-7, in embodiments, the first message may be sent by the digital asset exchange computer system to the first user device. In embodiments, such a message may be made via a secure channel, such as an encrypted communication. For example, the message may be encrypted using an asymmetric key, such as a PKI key, or using a symmetric key, such as used in TLS, to name a few. The communication, in embodiments, may be encrypted by the sender (e.g., the digital asset exchange computer system) and/or the recipient (e.g., the first user device), to name a few.

The first designated key pair associated with the first designated public address on the second blockchain (e.g., on-line keyset 1 1362) may include, at least, a first designated public key and a corresponding first designated private key. The first designated public key, in embodiments, may be used to provide the first designated public address (e.g., the second user public address 11728) on the second blockchain (e.g., second blockchain 11726), which may be associated with an underlying digital asset (e.g., FILECOIN). The underlying digital asset (e.g., FILECOIN, BITCOIN, NEO, and/or ETHER, to name a few) may be maintained on a distributed public transaction ledger maintained in the form of a second blockchain (e.g., second blockchain 11726). In embodiments, a first computer system (e.g., digital asset exchange computer system) may store the first designated private key (e.g., the private key associated with first keyset 11704-C-1, the private key associated with the Nth keyset 11704N-C-1, to name a few) similarly to on-line keyset 1 1362. The digital asset exchange computer system, in embodiments, may have access to, or be connected with, the distributed public transaction ledger through a network, such as the internet (e.g., network 15). In embodiments, the first designated private key may be mathematically related to the first designated public key. In embodiments, the first designated public address is the first designated public key. In embodiments, the first designated public address is derived from the first designated public key.

In embodiments, the first designated key pair may include a plurality of key pairs (e.g., on-line keyset N 1362N). For example, the first designated key pair may further include a first additional designated public key and a corresponding first additional designated private key. In embodiments, each key pair of the aforementioned plurality of key pairs of the first designated key pair may each correspond to a designated public address. For example, a first key pair of the plurality of key pairs may correspond to a first designated public address associated with the underlying digital asset. A second key pair of the plurality of key pairs may correspond to a second designated public address associated with the underlying digital asset. In embodiments, each key pair of the aforementioned plurality of key pairs may correspond to the same designated public address. For example, the first and second key pairs mentioned in the examples above may be associated with the same designated public address.

In embodiments, the first designated public address may be derived by using and/or applying a cryptographic hash function of the first designated public key. In embodiments, the first designated public address is a result of the cryptographic hash function, or, in embodiments, at least a part of the result of the cryptographic hash function. A cryptographic hash function may be a hash function that is a mathematical algorithm which maps data of arbitrary size to a bit string of a fixed size (e.g., a hash). In embodiments, the cryptographic hash function may be designed to be a one-way function (e.g., a function that is infeasible to invert). The cryptographic hash function, may include one or more of the following prosperities: (1) deterministic such that the same message produces results in the same hash; (2) high speed, such that the hash value for a message is computed in a manner that does not slow the process down; (3) infeasible to generate a message from the hash, such that generating a message from the hash value would require attempting all possibilities (e.g. a brute force approach); and (4) unique, such that messages to not have the same hash value and/or small changes to a message alter the hash value such that the values do not correlate, to name a few. In embodiments, the first designated public address is derived from a multi-party computation. In embodiments, the first designated key pair is derived from a multi-party computation.

The first designated key pair (first keyset 11704-C-1), in embodiments, may be stored in memory (e.g., memory 6102-C) operatively connected to the digital asset exchange computer system 6102. In embodiments, the digital asset exchange computer system 6102 may transmit the first designated key pair to a first user device (e.g., first user device 11704 . . . Nth first user device 11704N). For example, the digital asset exchange computer system 6102 may generate the first designated key pair and transmit the first designated key pair to the first user device 11704. Continuing the example, the first designated key pair may be received by the first user device 11704 and stored in memory 11704-C. As another example, the digital asset exchange computer system 6102 may generate a first message including instructions for a smart contract (e.g., first smart contract 11714A, second smart contract 11716A, third smart contract 11718A, to name a few) to generate the first designated key pair (and/or the first designated public address). The first message, in embodiments, may be encrypted and/or digitally signed by the administrator system (e.g., using a private key associated with the administrator system) and/or digitally signed by the administrator system and the first user device (e.g., via MPC). The generated designated key pair, continuing the example, may be obtained by the digital asset exchange computer system 6102, saved in memory operatively connected to the digital asset exchange computer system 6102, and/or transmitted to the first user device 11704. In embodiments, the generated designated key pair may be obtained by the first user device 11704 from the smart contract.

The process for wrapping a second digital asset (e.g., FILECOIN) with a first digital asset (e.g., EFIL), may continue with step S11906A. Referring back to FIG. 119A, in embodiments, at step S11906A, the digital asset exchange computer system may confirm that a first deposit of a first amount of the second digital asset occurred at the first designated public address. In embodiments, the digital asset exchange computer system may monitor the first designated public address for activity (e.g., transactions). In embodiments, the first designated address may be monitored by (and/or on behalf of) the digital asset exchange associated with the digital asset exchange computer system. The digital asset exchange, in embodiments, may monitor the first designated public address continuously, in substantially real time, at predetermined intervals (e.g., at the end of a business day, every hour, twice a day, etc.), and/or aperiodically when requested, to name a few. In embodiments, the digital asset exchange may employ one or more third-parties (e.g., one or more watchtower systems) to monitor the first designated public address (and/or other public addresses associated with the issuance and/or burning of the digital asset tokens and/or other digital assets) for any activity (e.g., a published transaction, a published message, a published transaction intent, to name a few). To enable a third-party to monitor the first designated public address (and/or other public addresses associated with the issuance of the digital asset tokens), the digital asset exchange may generate and transmit monitoring information to a third-party computer system associated with the one or more third-parties via network 125. In embodiments, the transmission would be via a secure transmission channel, such as an encrypted transmission using an asymmetric key (such as PKI) or a symmetric key (such as TLS) to name a few. The transmission, in embodiments, may be encrypted by the sender (e.g., the digital asset exchange computer system) and/or the recipient (e.g., the third-party system), to name a few.

In embodiments, the digital asset exchange computer system 6102 may employ one or more third-parties to monitor the first designated public address (and/or other public addresses associated with the deposit of collateral for the purpose of the issuance of the digital asset tokens on a different blockchain) for any activity (e.g. a published transaction, a published message—which may be digitally signed and/or encrypted in accordance with the descriptions herein, a published transaction intent, to name a few). To enable a third-party to monitor the first designated public address (and/or other public addresses associated with the issuance of the digital asset tokens), the digital asset exchange computer system 6102 may generate and transmit monitoring information to a third-party computer system associated with the third-party via network 125. The monitoring information may be included in a message, which, in embodiments, may be digitally signed by the digital asset exchange computer system (e.g., using a private key associated with the administrator system) and/or digitally signed by the digital asset exchange computer system, the third-party computer system and/or the first user device (e.g., via MPC). The monitoring information, in embodiments, may include one or more of the following: (1) the first designated public address (e.g., second user public address); (2) additional public addresses associated with the first user on the second blockchain; (3) the second exchange public address 11730; (4) the reserve public address 11732; and/or (5) a combination thereof, to name a few. In embodiments, the third-party computer system may monitor the blockchain (e.g., second blockchain 11726) for a published transaction associated with the first designated public address. This monitoring may be continuous, in substantially real time, and/or or at predetermined intervals, to name a few. For example, the third-party computer system may only check the first designated public address twice a day (e.g., by generating and sending a call to the second designated public address via the second blockchain 11726). If the third-party computer system detects a published transaction associated with the second designated public address, the third-party computer system may generate and send a notification to the digital asset exchange 6110. The notification, in embodiments, may indicate one or more of the following: (1) the published transaction; (2) a type of digital asset on the second blockchain 11726 (e.g., FILECOIN); (3) a first amount of the type of digital asset; (4) a public address on the first blockchain 11712 to which the issued tokens (e.g., EFIL) are deposited; (5) an identifier associated with a first user (e.g., the first user associated with the first user device requesting the issuance of the type of digital asset); (6) a smart contract address associated with the smart contract responsible for issuing the first amount of the type of digital asset on the first blockchain 11712 (e.g., first smart contract 11714A, second smart contract 11716A, third smart contract 11718A, to name a few); (7) a public key associated with the first user (e.g., corresponding to one or more of the first user public address 11720 and/or the second user public address 11728); (8) a timestamp associated with the transaction request; (9) a source public address from which the deposit of the first amount of the second digital asset originated; and/or (10) a combination thereof, to name a few. In embodiments, the third-party computer system and components therein may be similar to the description of the digital asset exchange computer system 6102 and corresponding components, the descriptions of which applying herein.

Continuing the example, the first user via an associated first user device may generate a transaction request including instructions to transfer the first amount of second digital asset (e.g., 10 FILECOIN) from a public address associated with the first user on the second blockchain to the first designated public address (e.g., the second user public address 11728) on the second blockchain. In embodiments, the transaction request may include a storage deal (e.g., with one or more storage miners on the FILECOIN Network) and/or a retrieval deal (e.g., with one or more retrieval miners on the FILECOIN Network). In embodiments, such as with other digital assets, the transaction request may include other pertinent requests. In embodiments, storage miners and retrieval miners may be separate entities. In embodiments, one or more storage miners may also be retrieval miners (and vice versa). The transaction request, in embodiments, may include (1) instructions to retrieve the 10 FILECOIN from the public address associated with the first user and/or (2) instructions to store the 10 FILECOIN in the designated public address (e.g., the second user public address 11728), as well as a digital signature based on a private key associated with the first user and/or the administrator. In embodiments, the transaction request may include one or more transaction requests (e.g., the first transaction request including retrieval instructions). The transaction request, in embodiments, may include instructions which account for one or more fees on the blockchain. For example, the transaction request may include instructions to account for a dynamic BaseFee which may be adjusted based on network congestion parameters (e.g., block sizes).

Continuing the example, the first user, via a corresponding first user device, may publish the generated transaction request on the second blockchain (e.g., second blockchain 11726). In embodiments, such publication will involve digitally signing the transaction request by a private key (or keys) associated the source public address (e.g., the public address associated with the first user) and/or sending a message that is digitally signed by a private key (or keys) associated the source public address (e.g., the public address associated with the first user) and include, as a recipient, at least the first designated public address. In embodiments, such a transaction request may be via a secure channel, such as an encrypted communication. For example, the communication may be using an asymmetric key, such as a PKI key, or using a symmetric key, such as used in TLS, to name a few. The communication, in embodiments, may be encrypted by the sender (e.g., the first user) and/or the recipient (e.g., one or more miners associated with the second blockchain), to name a few.

In embodiments, the digital asset exchange computer system may confirm the first amount of the second digital asset was transferred into the first designated public address by determining the first amount of the second digital asset was transferred to the first designated public address (e.g., the second user public address 11728). In embodiments, the confirmed and/or detected transaction associated with the first designated public address may include a deposit from one user representing a plurality of deposits from a plurality of users (e.g., by generating and sending a call to the first designated public address via the second blockchain to confirm the first amount of the second digital asset is present at the first designated public address). The call, in embodiments, may result in a return from the first designated public address confirming the first user's deposit. In embodiments, the return may not confirm the first user's deposit. In such embodiments, the process described in connection with FIGS. 119A, 119A-1, and 119A-2 may end (and/or pause until a transaction can be confirmed). In embodiments, the digital asset exchange computer system may generate and send a message reminding the first user to deposit the second digital asset into the first designated public address to complete the request to wrap the first amount of the second digital asset. The message, in embodiments, may be generated and/or sent at once a predetermined amount of time has elapsed (e.g., an hour, a day, a week, a month, etc.). The predetermined amount of time, in embodiments, may be determined by the digital asset exchange computer system (e.g., as a default option) and/or determined by user preferences (e.g., associated with the first user). In embodiments, the generation and/or transmission of the message may be via a secure transmission channel, such as an encrypted transmission using an asymmetric key (such as PKI) or a symmetric key (such as TLS) to name a few. The generation and/or transmission, in embodiments, may be encrypted by the sender (e.g., the digital asset exchange computer system) and/or the recipient (e.g., the first user device), to name a few.

In embodiments, the digital asset exchange computer system 6102 may verify the published transaction request. In embodiments where the digital asset exchange computer system 6102 verifies the published transaction request, the digital asset exchange computer system 6102 may generate and/or publish a transaction request to the first designated public address on the second blockchain. In embodiments, the digital asset exchange computer system 6102 may verify one or more of the following: (1) the digital signature associated with the transaction request is associated with an authorized first user; (2) an identifier associated with a first user is associated with an authorized first user; (3) a public key associated with the transaction request is associated with an authorized first user; (4) the format of the transaction request complies with one or more exchange format requirements; and/or (5) a combination thereof, to name a few. For example, the digital asset exchange computer system 6102 may verify the public key associated with the published transaction request is an authorized public key associated with a first user associated with the digital asset exchange computer system. In embodiments, the digital asset exchange computer system 6102 may have a list of authorized public keys and the users said authorized public keys are associated with. This list may be populated by authorized public key information received by the administrator system from one or more users. The aforementioned list, in embodiments, may be stored on memory 6102-C and accessed by the digital asset exchange computer system 6102. In embodiments, the transaction requests may be verified by comparing a respective transaction request with code templates including blanks for specific information (e.g., the digital signature associated with the transaction request, the identifier associated with a first user, the public key associated with the transaction request, and/or the smart contract address, to name a few). The code template(s), in embodiments, may be provided to the First user device(s) by the digital asset exchange computer system 6102. In embodiments where the transaction request is verified, digital asset exchange computer system may compare the remaining code in the transaction request to the authorized code template. The transaction request(s), in embodiments, may be digitally signed by the digital asset exchange computer system (e.g., using a private key associated with the digital asset exchange computer system) and/or digitally signed by the digital asset exchange computer system and the first user device (e.g., via MPC).

In embodiments, the published transaction may not be verified. In embodiments where the digital asset exchange computer system 6102 is unable to verify the published transaction request, a failed verification notification may be generated. In such embodiments, a failed verification notification may be generated by the digital asset exchange computer system 6102. The notification, in embodiments, may include one or more of the following: (1) the information that was not verified; (2) whether the first user may continue issuing tokens; and/or (3) options to cure the verification issue, to name a few. In embodiments, the digital asset exchange computer system 6102 may determine one or more solutions to cure the failed verification. The communication, in embodiments, may be encrypted and/or digitally signed by the digital asset exchange computer system 6102 (e.g., using a private key associated with the administrator system) and/or digitally signed by the administrator system and the first user device (e.g., via MPC). In embodiments, an unverified transaction, in embodiments, may cause the second blockchain to generate and/or publish a failed verification notification. The published failed verification notification may be obtained by the first user device associated with the first transaction request. The published communication, in embodiments, may be encrypted and/or digitally signed by the digital asset exchange computer system 6102 (e.g., using a private key associated with the administrator system) and/or digitally signed by the digital asset exchange computer system 6102 and the first user device (e.g., via MPC).

The process described in connection with FIG. 119A, in embodiments, may continue with step S11908A. At step S11908A, in embodiments, the digital asset exchange may issue the second amount of the first digital asset to the first user. A more detailed description of issuing the first digital asset, in embodiments, is illustrated in connection with FIG. 119A-2. Referring to FIG. 119A-2, in embodiments, the process for issuing the second amount of the first digital asset may begin with step S11908A-1. At step S11908A-1, in embodiments, the digital asset exchange computer system may generate a second transaction request. The second transaction request, in embodiments, may include instructions to transfer a third amount of the second digital asset from the first designated public address to a reserve public address (e.g., reserve public address 11732) and/or a fourth amount of the second digital asset from the first designated public address to an exchange public address (e.g., Second Exchange Public Address 11730) associated with the digital asset exchange. In embodiments, the deposit of the first amount of the second digital asset into the first designated public address may trigger action from the digital asset exchange computer system. Continuing the example, the detection of the deposit of the first amount of second digital asset into the first designated public address may trigger the digital asset exchange system to transfer a first portion (e.g., the Second Amount of Second Digital Asset 11738) of the deposited amount (the first amount of second digital asset) into a reserve (e.g., reserve public address 11732, reserve(s)

11734, to name a few) and a second portion (e.g., the Third Amount of Second Digital Asset 11740, such as 1 FILECOIN) of the deposited amount (e.g., the first amount of the second digital asset) into an exchange public address on the second blockchain (e.g., Second Exchange Public Address 11730) associated with the digital asset exchange. In embodiments, the exchange public address may be used to pay for fees associated with the administration of the wrapping of digital assets and the corresponding network(s). In embodiments, the transfers may be performed in a single step, or include multiple transfer steps. In embodiments, the deposited amount of digital assets may be made into a single public address, two public addresses, or more than two public addresses, to name a few. In embodiments, the deposit may trigger three transfers—a first transfer of a first portion (e.g., the Second Amount of Second Digital Asset 11738, such as 8 FILECOIN) of the deposited amount (e.g. 10 FILECOIN) into a reserve (e.g., reserve public address 11732 for reserve(s) 11734, to name a few), a second portion (e.g., the Third Amount of Second Digital Asset 11740, such as 1 FILECOIN) of the deposited amount (e.g., 10 FILECOIN) into an exchange public address (e.g., Second Exchange Public Address 11730) associated with an administrator (e.g., digital asset exchange computer system 6102, administrator system 6801, and/or administrator system 1801, to name a few), and a third portion (e.g., 1 FILECOIN) to one or more miner addresses to account for fees associated with the transaction request.

The second transaction request, in embodiments, may include instructions to transfer a portion of the first amount of the second digital asset to an offline reserve. In embodiments, an off-line reserve (e.g., Reserve(s) 11734) may hold one or more of the second digital assets transferred to the first designated public address (e.g., off-line public address 11817, off-line public address N 1817N). The system described in connection with FIGS. 117A, 117B-1, 117B-2, 117B-3, 117C-1, 117C-2, 117C-3, 119A-1, 119A-2, 119B-1, and 119B-2, may also include one or more off-line keyset 1803, . . . 1803N as a reserve for digital assets backing digital asset tokens (e.g., EFIL) issued on the first blockchain 11712. Each keyset includes a private key and a corresponding public key (or public address on the blockchain). The offline keyset 1803 may be stored in on non-volatile computer readable memory of one or more computer systems that are physically separated from network 125, the blockchain, administrator system, and/or the one or more computer systems that store the on-line keysets, such as an additional computer system. In embodiments, the second computer system that is physically separated and/or electronically may be a hardware storage module (HSM 1900—as described more fully in connection with FIG. 13B). The physical and/or electronic separation may serve as an additional security measure(s), protecting the one or more off-line keyset 1803, . . . 1803N from unauthorized access of reserves of digital assets (e.g., FILECOIN) backing digital asset tokens (e.g., EFIL) issued by the digital asset exchange computer system (e.g., digital asset exchange computer system 6102). In embodiments, the one or more off-line keysets may be associated with address on the first blockchain 11712 and/or the second blockchain 11726.

As noted above, the second transaction request, in embodiments, may include instructions to transfer a second amount of the second digital asset from the first public address (e.g., an additional public address associated with the first user, the second user public address 11728, to name a few) to a first designated public address (e.g., the second user public address 11728, second exchange public address 11730, the reserve public address 11732, to name a few) and to transfer a third amount of the second digital asset from the first public address (e.g., an additional public address associated with the first user, the second user public address 11728, to name a few) to a second public address (e.g., the second exchange public address 11730, the reserve public address 11732, to name a few). The second amount, in embodiments may be the first amount of the second digital asset less a fee. The third amount, in embodiments, may be a fee associated with issuing a second digital asset (e.g., EFIL) on a first blockchain (e.g., first blockchain 11712) backed by a second digital asset (e.g., FILECOIN) held in a reserve (e.g., reserve public address 11732. Reserve(s) 11734) on a second blockchain (e.g., second blockchain 11726), where the second digital asset (e.g., EFIL) on the first blockchain (e.g., first blockchain 11712) is pegged to the second digital asset (e.g., FILECOIN) on the second blockchain (second blockchain 11726). The second transaction request, in embodiments, may be digitally signed by the digital asset exchange computer system (e.g., using a private key associated with the digital asset exchange computer system) and/or digitally signed by the digital asset exchange computer system and the first user device (e.g., via MPC). In embodiments, the second transaction request may include instructions to transfer one or more digital assets held in an off-line reserve (e.g., reserve(s) 11734). In such embodiments, the digital asset exchange computer system may transfer one or more digital assets from the off-line reserve to one or more of: the reserve public address 11732, the second entity public address 11728, and/or the second exchange public address, to name a few.

In embodiments, the digital asset exchange computer system 6102 may "wrap" digital assets in exchange for some consideration such as an upfront fee (e.g., a set amount of digital math-based assets) and/or a payment of transaction fees (e.g., a fixed amount or set percentage of the transaction) from the first user associated with the request to issue the first digital asset. In embodiments, digital assets in the form of a digital asset token, such as Gas, may be used to pay such fees. The generated transaction request, in embodiments at step S11908A-2, may be published via the blockchain (e.g., the second blockchain 11726). The generated transaction request, in embodiments, may be digitally signed by the administrator system (e.g., using a private key associated with the administrator system) and/or digitally signed by the administrator system and the first user device (e.g., via MPC). In embodiments, the digital asset exchange computer system 6102 (and/or one or more smart contracts) may determine the amount of digital asset tokens (e.g., EFIL) to issue based on an exchange rate associated with the second digital asset (which may be similar to the description of the use of exchange rates throughout this application, the descriptions of which applying herein). In embodiments, the digital asset computer system 6102 may determine the second amount of the second digital asset and/or the third amount of the second digital asset based on predetermined rules (e.g., fees associated with the issuing of digital asset tokens (e.g., EFIL), which may be a value based on the amount of digital asset deposited (e.g., FILECOIN)—by percentage and/or amount of the value associated with the second digital asset) and/or an exchange rate associated with the second digital asset (may be similar to the description of the use of exchange rates throughout this application, the descriptions of which applying herein).

In embodiments, the process of issuing the first digital asset may continue with step S11908A-3. At step S11908A-3, in embodiments, the digital asset exchange computer system may confirm the execution of the second transaction request on the second blockchain. In embodiments, to confirm execution of the second transaction request, the reserve (e.g., the reserve public address 11732 and/or the reserve(s) 11734) and/or an exchange public address on the second blockchain (e.g., second exchange public address 11730) may be monitored by (and/or on behalf of) the digital asset exchange. For example, the reserve (e.g., the reserve public address 11732 and/or the reserve(s) 11734) and/or an exchange public address on the second blockchain (e.g., second exchange public address 11730) may be monitored by (and/or on behalf of) the digital asset exchange (e.g., similar to the monitoring of step S11906A described above in connection with FIG. 119A, the description of which applying herein). In embodiments where the digital asset exchange computer system 6102 verifies the published second transaction request, the digital asset exchange computer system 6102 may generate and/or publish a call (which may be a digitally signed transaction request) to the first designated public address on the second blockchain. In embodiments, the digital asset exchange computer system 6102 may verify one or more of the following: (1) receipt of the third amount of second digital asset in the reserve(s); (2) receipt of the fourth amount of the second digital asset in the exchange public address; (3) a decrease in balance of the first designated public address; (4) the digital signature associated with the transaction request; (5) an identifier associated with the second transaction request; (3) a public key associated with the second transaction request; and/or (6) a combination thereof, to name a few. The call(s) and/or transaction request(s), in embodiments, may be digitally signed by the digital asset exchange computer system (e.g., using a private key associated with the digital asset exchange computer system) and/or digitally signed by the digital asset exchange computer system and the first user device (e.g., via MPC).

The process of issuing the first digital asset, in embodiments, may continue with step S11908A-4. At step S11908A-4, in embodiments, the digital asset exchange computer system may obtain transaction information associated with the transfer of the first amount of second digital asset, the third amount of second digital asset, and/or the fourth amount of second digital asset. In embodiments, upon confirming the transfer(s) were made (e.g., the second transaction request was executed), the digital asset exchange computer system may obtain information associated with the deposit into one or more of: the first designated public address (second user public address 11728), the reserves (reserve(s) 11734 and/or reserve public address 11732), and/or the second exchange public address 11730, to name a few. The transaction information (e.g., transaction information 11742), may include information indicating one or more of: the amount of the deposit, a request to generate the stable value token (e.g., wrap the second digital asset), a transaction ID, information sufficient to confirm the generated first digital asset (e.g., EFIL) is collateralized by the transferred second digital asset (e.g., information sufficient to identify the reserve public address 11732), and/or information sufficient to identify the first user, to name a few. For example, the transaction information may indicate the initial deposit of 10 FILECOIN, a request to wrap the 9 FILECOIN (assuming the fee is taken into account), a transaction ID, the reserve public address 11730 and information indicating the deposit was made by the first user. The transaction information, in embodiments, may be stored by the digital asset exchange computer system (and/or first user device) in memory operatively connected to the digital asset exchange computer system (and/or first user device).

In embodiments, the process of issuing a first digital asset on a first blockchain collateralized by a second digital asset on a second blockchain may continue with step S11908A-5. At step S11908A-5, in embodiments, the digital asset exchange computer system may update a first electronic ledger (e.g., first electronic ledger 115) to account for the transfer of the first amount of second digital asset, the transfer of third amount of the second digital asset, and/or the transfer of the fourth amount of the second digital asset. For example, upon determining a transfer was made into the reserve and/or exchange public address, the digital asset exchange computer system may, in embodiments, be triggered to automatically (and/or periodically) update a transaction ledger (e.g., electronic ledger computer system 5158, first transaction ledger 115, and/or second transaction ledger 115-1) to account for the deposits into one or more of: the first designated public address, the reserves, and/or the exchange public address, to name a few. The digital asset exchange computer system may update the electronic ledger via the first transaction ledger 115, second transaction ledger 115-1, and/or the electronic ledger computer system 5158, which may be operatively connected to the digital asset exchange computer system 6102. The electronic ledger computer system 5158, in embodiments, may be a component of and/or stored in memory (e.g., memory 6102-C) operatively connected to the digital asset exchange computer system 6102.

The process of issuing a first digital asset on a first blockchain collateralized by a second digital asset on a second blockchain, in embodiments, may continue with step S11908A-6. At step S11908A-6, in embodiments, the digital asset exchange computer system may generate a third transaction request including a second message with third instructions to print a fifth amount of the first digital asset embedded with at least a portion of the obtained transaction information. The third transaction request, in embodiments, may be digitally signed by the digital asset exchange computer system (e.g., using a private key associated with the digital asset exchange computer system) and/or digitally signed by the digital asset exchange computer system and the first user device (e.g., via MPC). The third transaction request, in embodiments, may include instructions to issue a fifth amount of a first digital asset (e.g., EFIL) to a second designated public address (e.g., the first user public address 11720 and/or the first exchange public address 11722) on a first blockchain (e.g., first blockchain 11712). In embodiments, the second designated public address may be one or more of the following: a designated public address on the first blockchain that is accessible to the first user device, a designated public address on the first blockchain that is accessible to the first user device and the digital asset exchange 6102, the first exchange public address 11722, the first user public address 11720, and/or a combination thereof, to name a few. In embodiments, the generated third transaction request may be encrypted and/or digitally signed (e.g., by the first user device and/or digital asset computer system) in a similar manner as described above in connection with FIGS. 119A, 119A-1, and 119A-2, the description of which applying herein.

In embodiments, the obtained transaction information may be utilized by the digital asset exchange computer system as part of the third generated transaction request to issue the first digital asset. The third transaction request, in embodiments, may include instructions to issue the first digital asset (e.g., EFIL) on the first blockchain (e.g., First Blockchain 11712) and instructions to embed information sufficient to indicate the first digital asset is collateralized by the second digital asset held in a reserve (e.g., reserve public address 11732 and/or reserve(s) 11734, to name a few) on the second blockchain (e.g., Second Blockchain 11726). Continuing the example, the administrator may generate the third transaction request including instructions to the first blockchain to issue stable value tokens (e.g., wrapped tokens) to a second designated public address (e.g., First User Public Address 11720) and/or a public address associated with the first user on a first blockchain (e.g., first blockchain 11712). In embodiments, each of the issued tokens on the first blockchain may collateralized by the second digital assets held in the reserve account on the second blockchain (e.g., second blockchain 11726). The instructions, in embodiments, may include information based on the obtained transaction information. In embodiments, the instructions may include a message which may be encrypted and/or digitally signed by one or more private key (or keys). In embodiments, the message may include the generated instructions. The transaction request, in embodiments, may be a request addressed to one or more smart contracts associated with the stable value token on the first blockchain 11712 (e.g., First Smart Contract 11714A, Second Smart Contract 11716A, and/or Third Smart Contract 11718A, to name a few). In embodiments, the instructions may be encrypted and/or digitally signed by one or more private key (or keys) associated with one or more smart contracts associated with the stable value token on the first blockchain (e.g., First Smart Contract 11714A, Second Smart Contract 11716A, and/or Third Smart Contract 11718A, to name a few).

The generated third transaction request, in embodiments, may include token information to be embedded within issued first digital asset. For example, the token information may include reference to the second digital asset (e.g., FILECOIN) transferred to the first designated public address, the reserve(s), and/or the exchange public address on the second blockchain. As described herein, the value of the second digital asset (e.g., EFIL) on the first blockchain, in embodiments, may be pegged to the second digital asset (FILECOIN) on the second blockchain. The included reference to the second digital asset, in embodiments, may enable a first user and/or vendor associated with the issuance of the first digital asset to confirm the existence of the first (and/or third as applicable) amount of the first digital asset. For example, the included reference (e.g., token information) may be information sufficient to indicate the public address holding the first (and/or third as applicable) amount of the second digital asset (e.g., the first designated public address, the second exchange public address 11730, the reserve public address 11732, to name a few) may be embedded within one or more of the issued first digital asset(s). For example, to verify the collateral of the second amount of the first digital asset, the first user and/or vendor may generate and send a call to the public address to confirm the existence of the first (and/or third as applicable) amount of the second digital asset. The public address, continuing the example, may send return information sufficient to confirm the existence of the first (and/or third as applicable) amount of the second digital asset. In embodiments, the token information may include one or more of the following: (1) reference to the second digital asset; (2) reference to the first (and/or third as applicable) amount of the second digital asset; (3) information sufficient to identify the reserve public address; (4) information sufficient to identify the first designated public address; (5) information sufficient to identify the exchange public address on the second blockchain; (6) information sufficient to identify the issuer responsible for and/or smart contract responsible for issuing the second digital asset of the second digital asset; (7) a timestamp indicating a time of issuance of the first digital asset; (8) a timestamp indicating a time of deposit of the second digital asset; and/or (9) a combination thereof, to name a few. The transaction request, in embodiments, may be digitally signed by the digital asset exchange computer system (e.g., using a private key associated with the digital asset exchange computer system) and/or digitally signed by the digital asset exchange computer system and the first user device (e.g., via MPC).

In embodiments, as illustrated in connection with FIG. 117, the first blockchain 11712 may include smart contract instructions (e.g., instructions associated with contract first smart contract 11714A, second smart contract 11716A, third smart contract 11718A) associated with issuing the first digital asset may be saved as part of the first blockchain (e.g., first blockchain 11712). In embodiments, the smart contract instructions, e.g., first smart contract instructions, may be associated with a first smart contract address on the first blockchain (e.g., first blockchain 11712) is provided. For example, the first smart contract instructions may include token creation instructions which may indicate one or more conditions under which digital asset tokens of the underlying digital asset are created. Conditions under which tokens are created, in embodiments, may include receiving a transaction request including required information and a digital signature (e.g., digitally signed by the first user device and/or the digital asset exchange computer system) based on an authorized private key (e.g., a private key associated with the first designated key pair, a portion of a private key generated using multi-party computation, to name a few). Required information for verifiable transaction requests, for example, may include one or more of the following: (1) a type of digital asset (e.g., FILECOIN) on the second blockchain 11726; (2) a first amount of the type of digital asset; (3) a public address on the first blockchain 11712 to which the issued tokens are deposited (e.g., first user public address 11730). (4) an identifier associated with a first user (e.g., the first user associated with the first user device requesting the issuance of the type of digital asset); (5) a smart contract address associated with the smart contract responsible for issuing the first amount of the type of digital asset (e.g., first smart contract 11714A, second smart contract 11716A, third smart contract 11718A, to name a few); (6) a public key associated with the first user (e.g., a public key (e.g., the first designated public key) corresponding to the first user public address 11720; (7) a public key (e.g., the first designated public key) corresponding to the second user public address 11728; (8) a transaction ID associated with the first and/or second transaction requests; and/or a combination thereof, to name a few); (9) the type of digital asset to be issued (e.g., EFIL); (10) the type of digital asset used as collateral to issue a second digital asset (e.g., EFIL); and/or (11) a combination thereof, to name a few. In embodiments, the smart contract instructions may be generated by the digital asset exchange computer system. The generated instructions, for example, may be included in a message and/or transaction request that is published to the first blockchain where the instructions may be stored at a public address associated with the generated instructions. The message and/or transaction request, in embodiments, may be encrypted and/or digitally signed by the digital asset exchange computer system (e.g., using a private key associated with the digital asset exchange computer system) and/or digitally signed by the digital asset exchange computer system and the first user device (e.g., via MPC). In embodiments, the message and/or transaction request including the generated instructions may be encrypted and/or digitally signed using one or more private keys associated with the digital asset exchange computer system (and/or the First user device(s)). In embodiments, such a request and/or message may be via a secure channel, such as an encrypted communication. For example, the communication may be using an asymmetric key, such as a PKI key, or using a symmetric key, such as used in TLS, to name a few. The communication, in embodiments, may be encrypted by a first user device and/or a digital asset exchange (e.g., the digital asset exchange computer system 6102).

For example, transactions and/or messages associated with the digital asset exchange computer system and/or the First user device(s) may be required to be digitally signed by a private key associated with the first user and/or digital asset exchange (e.g., for MPC key sets). For example, a message sent by a first user device to the digital asset exchange computer system may include all or a portion of a private key associated with the first user device. The message, continuing the example, may be verified by confirming the private key is associated with the first user device (and/or a public address associated with the first user device and/or public key associated with the first user device). In embodiments, messages and/or transactions sent to and/or from the digital asset exchange computer system and/or first user device may be encrypted. Encryption, for example, may enhance the security of sent and/or published messages and/or transactions. For example, a message and/or transaction, when sent by a first user (e.g., the First user device(s) to the digital asset exchange computer system, may be encrypted (e.g., by the digital asset exchange computer system 6102) using Rivest, Shamir, & Aldeman (RSA) algorithm(s). As another example, a message and/or transaction, when published to the blockchain, may be encrypted using Twofish algorithm(s). In embodiments, messages and/or transactions sent between one or more parties and/or published to the blockchain may be encrypted in accordance with one or more of encryption algorithm(s), such as: Triple Data Encryption Standard (DES), RSA, Blowfish, Twofish, Advanced Encryption Standard (AES), and/or a combination thereof, to name a few. Further, messages and/or transactions sent between one or more parties and/or published to the blockchain may be encrypted, which may include one or more of the following techniques: character substitution, scrambling, mapping, hashing, and/or a combination thereof, to name a few. In embodiments, symmetric and or asymmetric encryption algorithms may be applied.

For example, one or more transactions and/or messages may be encrypted and/or decrypted by using and/or applying a cryptographic hash function of one or more of: the one or more messages, the one or more transactions, the public key(s) associated with the one or more messages and/or transactions, the private key(s) associated with the one or more messages and/or transactions, and/or a combination thereof, to name a few. A cryptographic hash function may be a hash function that is a mathematical algorithm which maps data of arbitrary size to a bit string of a fixed size (e.g., a hash). In embodiments, the cryptographic hash function may be designed to be a one-way function (e.g., a function that is infeasible to invert). The cryptographic hash function, may include one or more of the following prosperities: (1) deterministic such that the same message produces results in the same hash; (2) high speed, such that the hash value for a message is computed in a manner that does not slow the process down; (3) infeasible to generate a message from the hash, such that generating a message from the hash value would require attempting all possibilities (e.g., a brute force approach); and (4) unique, such that messages to not have the same hash value and/or small changes to a message alter the hash value such that the values do not correlate, to name a few.

The identifier, in embodiments, may be a number, an alphanumeric sequence, and/or other unique sequence that can identify the respective first user. In embodiments, each first user associated with the First user device(s) may be associated with a unique identifier. Each identifier, in embodiments, may be stored in memory (e.g., memory 6102-C) operatively connected to the digital asset exchange computer system 6102. In embodiments, the identifier may be generated by the digital asset exchange computer system 6102 as part of an on-boarding process (described in more detail in connection with FIG. 118, the description of which applying herein). In embodiments, the identifier may be generated by a smart contract (e.g., first smart contract 11714A, second smart contract 11716A, third smart contract 11718A, to name a few) as part of an on-boarding process (described in more detail in connection with FIG. 118, the description of which applying herein).

In embodiments, the required information may include confirmation of a deposit of a first amount of a second digital asset on the second blockchain 11726 at a designated public address on the second blockchain 11726 (e.g., the exchange public address 11730, the reserve public address 11732, and/or the second user public address 11728, to name a few). The first amount, in embodiments, may correspond the second amount of the first digital asset first type of to be issued using the second amount of the second type of digital asset as collateral (e.g., via a predetermined ratio, the value of the first type of digital asset, the value of the second type of digital asset, to name a few). For example, for every 1 first digital asset on the first blockchain 11712 (e.g., EFIL), a corresponding 1 second digital asset is held on the second blockchain 11726 (e.g., FILECOIN).

In embodiments, the transaction request may be published to the blockchain to a second smart contract address associated with a second smart contract. The second smart contract may verify the message and execute instructions to the smart contract listed in the required information (and/or a predetermined smart contract). The message and/or transaction request, in embodiments, may be encrypted and/or digitally signed by the digital asset exchange computer system (e.g., using a private key associated with the digital asset exchange computer system) and/or digitally signed by the digital asset exchange computer system and the first user device (e.g., via MPC).

The first smart contract instruction(s), in embodiments, may be saved as part of the first blockchain (e.g., the first blockchain 11712, second blockchain 11726 and include one or more of the following instructions: (1) token creation instructions; (2) address generation instructions; (3) delegation instructions; (4) transaction generation instructions; (5) authorization instructions; (6) verification instructions; (7) token transfer instructions; (8) token destruction instructions; (9) store instructions; (10) balance modification instructions; (11) transaction identification instructions; and/or (12) a combination thereof, to name a few. The first smart contract instructions, in embodiments, may include instructions associated with one or more smart contracts (e.g., first smart contract 11714A, second smart contract 11716A, third smart contract 11718A, to name a few). In embodiments, each published instruction may: (1) correspond to the same smart contract address; (2) correspond to a different smart contract address; and/or (3) correspond to a combination thereof, to name a few.

The token creation instructions, in embodiments, may include instructions related to increasing the supply of the first digital asset on the first blockchain 11712. In embodiments, the token creation instructions may indicate conditions under which new digital asset token(s) are issued and assigned (e.g., newly created or "minted" tokens assigned to specific designated public addresses or contract addresses on the first blockchain 11712). For example, the process of issuing the first digital asset on the first blockchain 11712 may include embedding information within each issued token. The embedded information (e.g., token information), in embodiments, may include reference to the second digital asset (e.g., the digital asset of which the first digital asset is pegged), reference to the amount of the second digital asset, information sufficient to identify the issuer of the second digital asset, a timestamp indicating a time of issuance, and/or a combination thereof, to name a few. In embodiments, the token creation instructions may cause the first smart contract 11714A to instruct (e.g., via a call) the second smart contract 11716A to alter a ledger, or otherwise record an increase or decrease in the token supply of the first digital asset. In embodiments, the authorization instructions may indicate a first designated custodian address (e.g., a custodian address associated with the first smart contract) with respect to the issuance of the first digital asset. The first designated address, in embodiments, may be a public address associated with the first user (e.g., first user public address 11720) and/or the digital asset exchange 6110 (e.g., the first exchange public address 11722; a generated public address associated with the first user and/or the digital asset exchange computer system; and/or reserve public address 11732, to name a few).

The delegation instructions, in embodiments, may include instructions which may indicate conditions under which one or more functions associated with issuing and/or burning the first digital asset to and/or from one or more delegated contract associated with the first blockchain are delegated. The one or more delegated contract addresses may include one or more contract addresses on the first blockchain 11712 associated with one or more of the first smart contract 11714A, the second smart contract 11716A, and/or the third smart contract 11718A, to name a few. In embodiments, the delegation instructions, may delegate data storage operations to an additional smart contract. In embodiments, the additional smart contract may be associated with a smart contract that executes storage instructions. For example, the first smart contract may execute delegation instructions causing the second smart contract to call the third smart contract. The second smart contract, in embodiments, may receive the call and execute storage instructions (e.g., to store information from a verified transaction request). Continuing the example, the second smart contract may return a confirmation to the first smart contract. The return, in embodiments, may be encrypted communication.

The authorization instructions, in embodiments, may include instructions which may indicate conditions under which digital assets, digital asset tokens, and/or tokens of the digital asset are created and/or burned. In embodiments, the first designated key pair is designated to authorize the authorization instructions. In embodiments, a second designated key pair is designated to be authorized to access and/or execute the authorization instructions. The authorization instructions, in embodiments, may include instructions limiting the creation and/or burning of digital asset tokens. In embodiments, the limitation placed on token creation and/or burning may prevent the creation and/or burning of tokens above a first threshold. For example, the authorization instructions may limit the creation and/or burning of digital assets to 100,000 digital assets. In embodiments, the first threshold may be relative to a first period of time. For example, the authorization instructions may limit the creation of digital assets to 500,000 digital assets per day. In embodiments, the authorization instructions may, when executed designate a first designated custodian address (e.g., a custodian address) with respect to issuing digital asset, burning digital assets, and/or holding digital assets of which the issued digital asset are pegged.

Verification instructions, in embodiments, may indicate conditions under which transaction requests are verified. One or more conditions under which transaction requests are identified may include verifying one or more of the following: (1) the digital signature is associated with an authorized first user; (2) an identifier associated with a first user is associated with an authorized first user; (3) a smart contract address associated with the smart contract responsible for issuing the first amount of the first digital asset is associated with an authorized first user; (4) a public key is associated with an authorized first user; (5) the format of the transaction request complies with one or more exchange format requirements; (6) the digital signature is associated with the digital asset exchange; and/or (7) a combination thereof, to name a few. In embodiments, a transaction request may not be verified. An unverified transaction may cause the first smart contract to call an additional smart contract (e.g., the second smart contract, the third smart contract, to name a few) to generate, store, and/or publish a failed verification notification as part of the first blockchain. In embodiments, the digital asset exchange computer system 6102 may generate a failed verification notification may indicate one or more of the following: (1) the information in the transaction request that was not verified; (2) whether the first user may continue issuing tokens; and/or (3) options to cure the verification issue, to name a few. In embodiments, the digital asset exchange computer system 6102 may determine how to solve the verification issue. For example, the first user device 11704 may have forgotten to put in an amount of digital asset in the order and the failed verification notification may indicate as such. The message, in embodiments, may be encrypted and/or digitally signed by the digital asset exchange computer system (e.g., using a private key associated with the digital asset exchange computer system) and/or digitally signed by the digital asset exchange computer system and the first user device (e.g., via MPC).

The token transfer instructions, in embodiments, may indicate conditions under which issued and/or deposited digital assets are transferred. In embodiments, the conditions may include a verified deposit of digital assets and/or a verified transaction request, to name a few. For example, a verified transaction may result in the execution of the token transfer instructions, automatically triggering the transfer of issued first digital assets on the first blockchain to a public address associated and/or provided by the first user.

The token destruction instructions, in embodiments, may indicate conditions under which issued tokens are burned (e.g., destroyed). In embodiments, the token destruction instructions may be related to destroying and/or burning one or more issued tokens of the digital asset token. A more detailed description of burning issued tokens is located in the description of FIGS. 119B-1 and 119B-2, the description of which applying herein.

The store instructions, in embodiments, may indicate conditions under which data is saved. In embodiments, the store instructions may include instructions to store one or more of the following: a list of on-boarded users (e.g., by identifier, public address, etc.); a balance of the first digital asset associated with each first user; a balance of the second digital asset associated with each first user; and/or a combination thereof, to name a few. The data, in embodiments, may be saved as part of the first blockchain (e.g., the first blockchain 11712). In embodiments, the saved data may be accessible by one or more smart contracts (e.g., to verify a transaction request). The stored data may be updated continuously (e.g., with each transaction associated with each respective on-boarded user), periodically (e.g., every day, week, every second Thursday of the month, etc.), and/or aperiodically, to name a few.

The token balance modification instructions, in embodiments, may indicate one or more conditions under which a respective balance of digital asset associated with one or more users is modified. For example, upon notification of a verified transaction request associated with the first user, the smart contract may execute token balance modification instructions to modify a digital asset balance associated with the first user. The modification, for example, may account for the issued second amount of first digital asset.

The transaction identification instructions, in embodiments, may indicate one or more conditions under which transaction information is embedded into the issued digital assets. For example, the transaction identification information may be embedded in digital assets associated with a transaction involving 1000 digital asset in a different manner than transaction information associated with a transaction involving 1 digital asset.

In embodiments, first smart contract 11714A, second smart contract 11716A, third smart contract 11718A, may be similar to one or more of the following, the descriptions of each applying herein: PROXY Smart Contract 1310 of FIG. 18B, PRINT LIMITER Smart Contract 1360 of FIG. 18C, CUSTODIAN 2 Smart Contract 1350 of FIG. 18D, STORE Smart Contract 1330 of FIG. 18E, IMPL Smart Contract 1320 of FIG. 18F, first scripted address 6116 of FIGS. 61A and 65, second scripted address 6118 of FIGS. 61A and 65, and/or the PROXY smart contract 1310 of FIGS. 13B, 13D, and 13F.

The generated third transaction request, in embodiments at step S11908A-7, may be published via the blockchain (e.g., the first blockchain 11712). In embodiments, the generated third transaction request may be published to one or more smart contract address(es) associated with the issuance of stable value tokens (e.g., First Smart Contract 11714A, Second Smart Contract 11716A, and/or Third Smart Contract 11718A, to name a few) by the digital asset exchange computer system on the first blockchain (e.g., the first blockchain 11712). In embodiments, such publication may involve generating and sending a message that is digitally signed by the private key (or keys) associated with the digital asset exchange and/or the smart contract address(es) associated with the stable value token. The message, in embodiments, may include the transaction information to be embedded. The published transaction request, in embodiments, may trigger action from one or more smart contracts associated with the stable value token (e.g., first smart contract 11714A, second smart contract 11716A, and/or third smart contract 11718A, to name a few).

Continuing the example, the published second transaction request may be verified by the one or more smart contracts associated with the stable value token (e.g., first digital asset), based at least in part on the digital signature associated with the second transaction request (e.g., based on a private key associated with the digital asset exchange computer system). The one or more smart contracts, continuing the example, may issue digital asset tokens (e.g., the fourth amount of first digital asset 11748), which are collateralized by the 10 FILECOIN (and/or the portion of the 10 FILECOIN transferred into the reserve public address 11732), into a designated public address (e.g., first user public address 11720) on the first blockchain 11712 (e.g., the ETHERIUM blockchain). The issued stable value tokens, in embodiments, may be the generated and "wrap" the transferred first amount of second digital Referring to FIG. 119A, in embodiments, the process may continue with step S11910A. At step S11910A, in embodiments, the digital asset exchange computer system may confirm the issuance of the second amount of the first digital asset. In embodiments, the digital asset exchange computer system 6102 (and/or a third-party monitoring system) may confirm the third transaction request was executed. For example, the execution of the third transaction request may be confirmed by determining that the second amount of the first digital asset was issued to the first designated public address (e.g., the first user public address 11720) on the first blockchain (e.g., first blockchain 11712). In embodiments, the digital asset exchange computer system 6102 (and/or a third-party monitoring system) may confirm the execution of the third transaction by generating and/or sending a call to the first designated public address via network 125. The first designated public address may respond by generating and sending a return to the digital asset exchange computer system 6102 via network 125. The return, in embodiments, may confirm the execution of the third transaction request. The communication(s) described herein, in embodiments, may be encrypted and/or digitally signed by the administrator system (e.g., using a private key associated with the administrator system) and/or digitally signed by the administrator system and the first user device (e.g., via MPC). In embodiments where the execution of the third transaction request is not confirmed, a failed confirmation notification may be generated (the failed confirmation notification, in embodiments, may be similar to the failed verification notification and/or the failed confirmation message described above, the description of which applying herein) and sent to the first user device. The failed confirmation message, in embodiments, may be encrypted and/or digitally signed by the digital asset exchange computer system (e.g., using a private key associated with the administrator system) and/or digitally signed by the digital asset exchange computer system and the first user device (e.g., via MPC). In embodiments, an unconfirmed transaction execution may cause the first smart contract 11714A to call an additional smart contract (e.g., the second smart contract 11716A, the third smart contract 11718A, to name a few) to generate and/or publish a failed confirmation notification. The published failed confirmation notification may be obtained by the first user device associated with the first user. In embodiments, the communications (including messages, transaction requests, instructions, calls, and/or returns, to name a few) may be encrypted and/or digitally signed by the sender of the communication and/or the recipient of the communication.

The steps of the process described in connection with FIGS. 119A, 119A-1, and 119A-2 may be rearranged or omitted.

In embodiments, a method may comprise: (a) authenticating, by an administrator computer system associated with an administrator, an access request by a first user device associated with a first user, to the administrator computer system, wherein the administrator computer system is operatively connected to one or more databases which include: i. a first electronic ledger associated with a first digital asset maintained on a first distributed public transaction ledger in the form of a first blockchain that is maintained by a first blockchain network including a first plurality of geographically distributed computer systems in a first peer-to-peer network; ii. a second electronic ledger associated with a second digital asset maintained on a second distributed public transaction ledger in the form of a second blockchain that is maintained by a second blockchain network including a second plurality of geographically distributed computer systems in a second peer-to-peer network, wherein a ratio of second digital asset to first digital asset is a predetermined fixed ratio, and wherein authenticating the access request received from the first user device comprises the steps of: (1) receiving, by the administrator computer system from the first user device, an authentication request including first user credential information associated with the first user; (2) determining, by the administrator computer system, that the first user device is authorized to access the administrator computer system based at least in part on the first user credential information; (3) generating, by the administrator computer system, first machine-executable instructions including first graphical user interface information associated with a first graphical user interface; (4) transmitting, from the administrator computer system to the first user device, the first machine-executable instructions, wherein, upon execution of the first machine-executable instructions, the first user device displays the first graphical user interface; (b) receiving, by the digital asset computer system from the first user device, a first request to, in exchange for a first amount of the first digital asset, obtain a second amount of the second digital asset, comprising the steps of: (1) receiving, by the administrator computer system from the first user device, the first request; (2) verifying, by the administrator computer system, the first request by determining the first user has at least the first amount of the first digital asset based on reference to the first electronic ledger; (3) generating, by the administrator computer system, a first transaction request including first instructions to generate a first designated public address on the first blockchain, wherein the administrator computer system digitally signs the first transaction request with a first private key associated with the administrator; (4) publishing, by the administrator computer system, the first transaction request such that the first plurality of geographically distributed computer systems in the first peer-to-peer network verify the first transaction request and execute the first instructions by generating first designated address information including a first designated key pair associated with a first designated public address on the first blockchain; (5) obtaining, by the administrator computer system based on reference to the first blockchain, first designated address information; (6) generating, by the administrator computer system, a first message including instructions for the first user to transfer the first amount of the first digital asset to the first designated public address on the first blockchain; and (7) sending, by the administrator computer system to the first user device, the first message; (c) confirming, by the administrator computer system based on reference to the first blockchain, a first deposit of the first amount of the first digital asset by performing the steps of: (1) monitoring the first designated public address on the first blockchain; and (2) determining the first amount of the first digital asset was received at the first designated public address; (d) issuing, by the administrator computer system, the second amount of the second digital asset by performing the steps of: (1) generating, by the administrator computer system, a second transaction request including second instructions to: (i) transfer a third amount of the first digital asset from the first designated public address to a reserve public address on the first blockchain; (ii) transfer a fourth amount of the first digital asset from the first designated public address to a first exchange public address [FEES] on the first blockchain, wherein the administrator computer system digitally signs the second transaction request with a second private key associated with the administrator; (2) publishing, by the administrator computer system, the second transaction request such that the first plurality of geographically distributed computer systems in the first peer-to-peer network verify the second transaction request and execute the second instructions; (3) confirming, by the administrator computer system, the second transaction request was executed based on reference to the first blockchain; (4) obtaining, by the administrator computer system, first transaction information based on reference to the first blockchain, the first transaction information indicating the confirmed transfers of the first amount of the first digital asset, the third amount of the first digital asset, and the fourth amount of the first digital asset; (5) updating, by the administrator computer system, the first electronic ledger to account for the second transaction request; (6) generating, by the administrator computer system, a third transaction request including a second message comprising: (i) third instructions to print a fifth amount of the second digital asset to a second designated public address on the second blockchain, wherein the administrator computer system digitally signs the third transaction request with a third private key associated with the administrator, and wherein the fifth amount of the second digital asset is determined based on the predetermined fixed ration of the second digital asset to the first digital asset; and (ii) the first transaction information; and (7) publishing, by the administrator computer system to a first smart contract address on the second blockchain, the third transaction request, wherein the first smart contract address is associated with first smart contract instructions saved as part of the second blockchain and including: (i) verification instructions indicating conditions under which transaction requests published on the second blockchain and addressed to the first smart contract address are verified; and (ii) print instructions indicating conditions under which the second digital asset is issued to one or more public addresses on the second blockchain, wherein the third transaction request is verified in accordance with the verification instructions second designated public address on the second blockchain, and wherein the fifth amount of the second digital asset is printed in accordance with the print instructions; (e) confirming, by the administrator computer system based on reference to the second blockchain, that the third transaction request was executed in accordance with the first smart contract instructions by performing the steps of: (1) monitoring the second designated public address on the second blockchain; and (2) determining the fifth amount of the second digital asset was received at the second designated public address; and (3) updating, by the administrator computer system, the second electronic ledger to account for the fifth amount of the second digital asset being transferred to the second designated public address.

In embodiments, the second blockchain is the Ethereum network.

In embodiments, the first blockchain is the Bitcoin network.

In embodiments, the first blockchain is the Bitcoin Cash network.

In embodiments, the first blockchain is the Stellar network.

In embodiments, the first blockchain is the Filecoin network.

In embodiments, the first blockchain is the Litecoin network.

In embodiments, the first blockchain is the Tezos network.

In embodiments, the first blockchain is the Zcash network.

In embodiments, the first blockchain is the Neo network.

In embodiments, the first blockchain is the Ether Classic network.

In embodiments, the second blockchain is the Neo network.

In embodiments, the second blockchain is the Ether Classic network.

In embodiments, the digital signature is first transaction request include a digital signature generated using at least two private keys associated with the administrator.

In embodiments, the first transaction information comprises information sufficient to indicate a plurality of transactions, including, for each respective transaction: i. respective transaction identification information including a respective transaction identifier associated with the respective transfer of a respective amount of the first digital asset to a respective designated public address; ii. a first respective public address; and iii. a second respective public address.

In embodiments, the first transaction request includes a first plurality of instructions, each associated with generating a respective designated public address associated with depositing the first digital asset, wherein the second transaction request includes a second plurality of instructions, each associated with transferring a respective reserve amount of the first digital asset to the reserve public address and a respective fee amount of the first digital asset to the first exchange public address, and wherein the third transaction request includes a third plurality of instructions, each associated with transferring a respective amount of the second digital asset to a respective digital address on the second blockchain.

In embodiments, the first transaction request is digitally signed with at least two private keys associated with the administrator.

In embodiments, the second transaction request is digitally signed with at least two private keys associated with the administrator.

In embodiments, the third transaction request is digitally signed with at least two private keys associated with the administrator.

In embodiments, the first transaction request is published via a secure channel.

In embodiments, the second transaction request is published via a secure channel.

In embodiments, the third transaction request is published via a secure channel.

In embodiments, the first designated public address is unique to the first user.

In embodiments, the second designated public address is unique to the first user.

In embodiments, conditions under which transaction requests published on the second blockchain are verified in accordance with the verification instructions includes verifying a digital signature associated with published transaction requests such that the verified digital signature is associated with the administrator.

In embodiments, the first transaction information associated with the second transaction request includes an identifier unique to the second transaction request.

In embodiments, the method may further comprise: (m) prior to determining the first amount of the first digital asset was received at the first designated public address, generating third-party monitoring information including the first designated public address; (n) sending, by the administrator computer system to a third-party computer system associated with a third-party, the third-party monitoring information, wherein the third-party computer system monitors the first blockchain for one or more transactions associated with the first designated public address, wherein the third-party computer system determines the first amount of the first digital asset was received at the first designated public address, wherein the third-party computer system obtains the first transaction information, wherein the third-party computer system generates a notification indicating the obtained fist transaction information, and wherein the third-party computer system sends, to the administrator computer system, the generated notification.

In embodiments, wherein the notification is encrypted and sent via a secure channel.

In embodiments, the notification is encrypted by the third-party computer system.

In embodiments, the notification is encrypted communication.

In embodiments, the notification is encrypted using an asymmetric key.

In embodiments, the asymmetric key is a PKI key.

In embodiments, the notification is encrypted using a symmetric key.

In embodiments, the notification is encrypted in accordance with Transport Layer Security protocol.

In embodiments, the notification is encrypted by the administrator computer system.

In embodiments, the authentication request is made by the first user device via a secure channel.

In embodiments, the authentication request is encrypted communication.

In embodiments, the authentication request is encrypted using an asymmetric key.

In embodiments, the asymmetric key is a PKI key.

In embodiments, the authentication request is encrypted using a symmetric key.

In embodiments, the authentication request is encrypted in accordance with Transport Layer Security protocol.

In embodiments, the authentication request is encrypted by the first user device.

In embodiments, the authentication request is encrypted by the administrator computer system.

In embodiments, the first machine-executable instructions are transmitted by the administrator computer system via a secure channel.

In embodiments, the first machine-executable instructions are encrypted communication.

In embodiments, the first machine-executable instructions are encrypted using an asymmetric key.

In embodiments, the asymmetric key is a PKI key.

In embodiments, the first machine-executable instructions are encrypted using a symmetric key.

In embodiments, the first machine-executable instructions are encrypted in accordance with Transport Layer Security protocol.

In embodiments, the first machine-executable instructions are encrypted by the first user device.

In embodiments, the first machine-executable instructions are encrypted by the administrator computer system.

In embodiments, the first request is made by the first user device via a secure channel.

In embodiments, the first request is encrypted communication.

In embodiments, the first request is encrypted using an asymmetric key.

In embodiments, the asymmetric key is a PKI key.

In embodiments, the first request is encrypted using a symmetric key.

In embodiments, the first request is encrypted in accordance with Transport Layer Security protocol.

In embodiments, the first request is encrypted by the first user device.

In embodiments, the first request is encrypted by the administrator computer system.

In embodiments, the first message is sent by the administrator computer system via a secure channel.

In embodiments, the first message is encrypted communication.

In embodiments, the first message is encrypted using an asymmetric key.

In embodiments, the asymmetric key is a PKI key.

In embodiments, the first message is encrypted using a symmetric key.

In embodiments, the first message is encrypted in accordance with Transport Layer Security protocol.

In embodiments, the first message is encrypted by the first user device.

In embodiments, the first message is encrypted by the administrator computer system.

In embodiments, the first transaction request is published via a secure channel.

In embodiments, the second transaction request is published via a secure channel.

In embodiments, the third transaction request is published via a secure channel.

In embodiments, the second blockchain is based on a mathematical protocol for proof of work.

In embodiments, the second blockchain is based on a mathematical protocol for proof of stake.

In embodiments, the second blockchain is based on a cryptographic mathematical protocol.

In embodiments, the method may further comprise a step of publishing, by the administrator computer system to a side ledger, transaction instructions associated with crediting the second amount of the second digital asset and the publishing step (d)(2) includes publishing the transaction instruction from the side ledger to the second distributed public asset ledger periodically or aperiodically.

In embodiments, the first electronic ledger is maintained and stored on the first plurality of geographically distributed computer systems in the first peer-to-peer network in the form of the first blockchain.

In embodiments, the first electronic ledger is maintained on a sidechain, separate from the first blockchain, wherein information on the sidechain is published and stored on the first blockchain periodically or aperiodically.

In embodiments, the second electronic ledger is maintained and stored on the second plurality of geographically distributed computer systems in the second peer-to-peer network in the form of the second blockchain.

In embodiments, the second electronic ledger is maintained on a sidechain, separate from the second blockchain, wherein information on the sidechain is published and stored on the second blockchain periodically or aperiodically.

In embodiments, the first electronic ledger and the second electronic ledger are maintained in separate databases.

In embodiments, the predetermined fixed ratio is one first digital asset for one second digital asset.

In embodiments, the predetermined fixed ratio is 100 first digital asset for one second digital asset.

In embodiments, a method may comprise the steps of: (a) authenticating, by a digital asset exchange computer system associated with a digital asset exchange, an access request by a first user device associated with a first user, to the digital asset exchange computer system, wherein the digital asset exchange computer system is operatively connected to one or more databases which include: i. a first electronic ledger associated with a first digital asset maintained on a first distributed public transaction ledger in the form of a first blockchain that is maintained by a first blockchain network including a first plurality of geographically distributed computer systems in a first peer-to-peer network; ii. a second electronic ledger associated with a second digital asset maintained on a second distributed public transaction ledger in the form of a second blockchain that is maintained by a second blockchain network including a second plurality of geographically distributed computer systems in a second peer-to-peer network, wherein a ratio of second digital asset to first digital asset is a predetermined fixed ratio, and wherein authenticating the access request received from the first user device comprises the steps of: (1) receiving, by the digital asset exchange computer system from the first user device, an authentication request including first user credential information associated with the first user; (2) determining, by the digital asset exchange computer system, that the first user device is authorized to access the digital asset exchange computer system based at least in part on the first user credential information; (3) generating, by the digital asset exchange computer system, first machine-executable instructions including first graphical user interface information associated with a first graphical user interface; (4) transmitting, from the digital asset exchange computer system to the first user device, the first machine-executable instructions, wherein, upon execution of the first machine-executable instructions, the first user device displays the first graphical user interface; (b) receiving, by the digital asset computer system from the first user device, a first request to, in exchange for a first amount of the first digital asset, obtain a second amount of the second digital asset, comprising the steps of: (1) receiving, by the digital asset exchange computer system from the first user device, the first request; (2) verifying, by the digital asset exchange computer system, the first request by determining the first user has at least the first amount of the first digital asset based on reference to the first electronic ledger; (3) generating, by the digital asset exchange computer system, a first transaction request including first instructions to generate a first designated public address on the first blockchain, wherein the digital asset exchange computer system digitally signs the first transaction request with a first private key associated with the digital asset exchange; (4) publishing, by the digital asset exchange computer system, the first transaction request such that the first plurality of geographically distributed computer systems in the first peer-to-peer network verify the first transaction request and execute the first instructions by generating first designated address information including a first designated key pair associated with a first designated public address on the first blockchain; (5) obtaining, by the digital asset exchange computer system based on reference to the first blockchain, first designated address information; (6) generating, by the digital asset exchange computer system, a first message including instructions for the first user to transfer the first amount of the first digital asset to the first designated public address on the first blockchain; and (7) sending, by the digital asset exchange computer system to the first user device, the first message; (c) confirming, by the digital asset exchange computer system based on reference to the first blockchain, a first deposit of the first amount of the first digital asset by performing the steps of: (1) monitoring the first designated public address on the first blockchain; and (2) determining the first amount of the first digital asset was received at the first designated public address; (d) issuing, by the digital asset exchange computer system, the second amount of the second digital asset by performing the steps of: (1) generating, by the digital asset exchange computer system, a second transaction request including second instructions to: (i) transfer a third amount of the first digital asset from the first designated public address to a reserve public address on the first blockchain; (ii) transfer a fourth amount of the first digital asset from the first designated public address to a first exchange public address on the first blockchain, wherein the digital asset exchange computer system digitally signs the second transaction request with a second private key associated with the digital asset exchange; (2) publishing, by the digital asset exchange computer system, the second transaction request such that the first plurality of geographically distributed computer systems in the first peer-to-peer network verify the second transaction request and execute the second instructions, (3) confirming, by the digital asset exchange computer system, the second transaction request was executed based on reference to the first blockchain; (4) obtaining, by the digital asset exchange computer system, first transaction information based on reference to the first blockchain, the first transaction information indicating the confirmed transfers of the first amount of the first digital asset, the third amount of the first digital asset, and the fourth amount of the first digital asset; (5) updating, by the digital asset exchange computer system, the first electronic ledger to account for the second transaction request; (6) generating, by the digital asset exchange computer system, a third transaction request including a second message comprising: (i) third instructions to print a fifth amount of the second digital asset to a second designated public address on the second blockchain, wherein the digital asset exchange computer system digitally signs the third transaction request with a third private key associated with the digital asset exchange, and wherein the fifth amount of the second digital asset is determined based on the predetermined fixed ration of the second digital asset to the first digital asset; and (ii) the first transaction information; and (7) publishing, by the digital asset exchange computer system to a first smart contract address on the second blockchain, the third transaction request, wherein the first smart contract address is associated with first smart contract instructions saved as part of the second blockchain and including: (i) verification instructions indicating conditions under which transaction requests published on the second blockchain and addressed to the first smart contract address are verified; and (ii) print instructions indicating conditions under which the second digital asset is issued to one or more public addresses on the second blockchain, wherein the third transaction request is verified in accordance with the verification instructions second designated public address on the second blockchain, and wherein the fifth amount of the second digital asset is printed in accordance with the print instructions; (e) confirming, by the digital asset exchange computer system based on reference to the second blockchain, that the third transaction request was executed in accordance with the first smart contract instructions by performing the steps of: (1) monitoring the second designated public address on the second blockchain; and (2) determining the fifth amount of the second digital asset was received at the second designated public address; and (3) updating, by the digital asset exchange computer system, the second electronic ledger to account for the fifth amount of the second digital asset being transferred to the second designated public address.

In embodiments, the second blockchain is the Ethereum network.

In embodiments, the first blockchain is the Bitcoin network.

In embodiments, the first blockchain is the Bitcoin Cash network.

In embodiments, the first blockchain is the Stellar network.

In embodiments, the first blockchain is the Filecoin network.

In embodiments, the first blockchain is the Litecoin network.

In embodiments, the first blockchain is the Tezos network.

In embodiments, the first blockchain is the Zcash network.

In embodiments, the first blockchain is the Neo network.

In embodiments, the first blockchain is the Ether Classic network.

In embodiments, the second blockchain is the Neo network.

In embodiments, the second blockchain is the Ether Classic network.

In embodiments, the digital signature is first transaction request include a digital signature generated using at least two private keys associated with the digital asset exchange.

In embodiments, the first transaction information comprises information sufficient to indicate a plurality of transactions, including, for each respective transaction: i. respective transaction identification information including a respective transaction identifier associated with the respective transfer of a respective amount of the first digital asset to a respective designated public address; ii. a first respective public address; and iii. a second respective public address.

In embodiments, the first transaction request includes a first plurality of instructions, each associated with generating a respective designated public address associated with depositing the first digital asset, wherein the second transaction request includes a second plurality of instructions, each associated with transferring a respective reserve amount of the first digital asset to the reserve public address and a respective fee amount of the first digital asset to the first exchange public address, and wherein the third transaction request includes a third plurality of instructions, each associated with transferring a respective amount of the second digital asset to a respective digital address on the second blockchain.

In embodiments, the first transaction request is digitally signed with at least two private keys associated with the digital asset exchange.

In embodiments, the second transaction request is digitally signed with at least two private keys associated with the digital asset exchange.

In embodiments, the third transaction request is digitally signed with at least two private keys associated with the digital asset exchange.

In embodiments, the first transaction request is published via a secure channel.

In embodiments, the second transaction request is published via a secure channel.

In embodiments, the third transaction request is published via a secure channel.

In embodiments, the first designated public address is unique to the first user.

In embodiments, the second designated public address is unique to the first user.

In embodiments, conditions under which transaction requests published on the second blockchain are verified in accordance with the verification instructions includes verifying a digital signature associated with published transaction requests such that the verified digital signature is associated with the digital asset exchange.

In embodiments, the first transaction information associated with the second transaction request includes an identifier unique to the second transaction request.

In embodiments, the method may further comprise: (m) prior to determining the first amount of the first digital asset was received at the first designated public address, generating third-party monitoring information including the first designated public address; (n) sending, by the digital asset exchange computer system to a third-party computer system associated with a third-party, the third-party monitoring information, wherein the third-party computer system monitors the first blockchain for one or more transactions associated with the first designated public address, wherein the third-party computer system determines the first amount of the first digital asset was received at the first designated public address, wherein the third-party computer system obtains the first transaction information, wherein the third-party computer system generates a notification indicating the obtained fist transaction information, and wherein the third-party computer system sends, to the digital asset exchange computer system, the generated notification.

In embodiments, the notification is encrypted and sent via a secure channel.

In embodiments, the notification is encrypted by the third-party computer system.

In embodiments, the notification is encrypted communication.

In embodiments, the notification is encrypted using an asymmetric key.

In embodiments, the asymmetric key is a PKI key.

In embodiments, the notification is encrypted using a symmetric key.

In embodiments, the notification is encrypted in accordance with Transport Layer Security protocol.

In embodiments, the notification is encrypted by the digital asset exchange computer system.

In embodiments, the authentication request is made by the first user device via a secure channel.

In embodiments, the authentication request is encrypted communication.

In embodiments, the authentication request is encrypted using an asymmetric key.

In embodiments, the asymmetric key is a PKI key.

In embodiments, the authentication request is encrypted using a symmetric key.

In embodiments, the authentication request is encrypted in accordance with Transport Layer Security protocol.

In embodiments, the authentication request is encrypted by the first user device.

In embodiments, the authentication request is encrypted by the digital asset exchange computer system.

In embodiments, the first machine-executable instructions are transmitted by the digital asset exchange computer system via a secure channel.

In embodiments, the first machine-executable instructions are encrypted communication.

In embodiments, the first machine-executable instructions are encrypted using an asymmetric key.

In embodiments, the asymmetric key is a PKI key.

In embodiments, the first machine-executable instructions are encrypted using a symmetric key.

In embodiments, the first machine-executable instructions are encrypted in accordance with Transport Layer Security protocol.

In embodiments, the first machine-executable instructions are encrypted by the first user device.

In embodiments, the first machine-executable instructions are encrypted by the digital asset exchange computer system.

In embodiments, the first request is made by the first user device via a secure channel.

In embodiments, the first request is encrypted communication.

In embodiments, the first request is encrypted using an asymmetric key.

In embodiments, the asymmetric key is a PKI key.

In embodiments, the first request is encrypted using a symmetric key.

In embodiments, the first request is encrypted in accordance with Transport Layer Security protocol.

In embodiments, the first request is encrypted by the first user device.

In embodiments, the first request is encrypted by the digital asset exchange computer system.

In embodiments, the first message is sent by the digital asset exchange computer system via a secure channel.

In embodiments, the first message is encrypted communication.

In embodiments, the first message is encrypted using an asymmetric key.

In embodiments, the asymmetric key is a PKI key.

In embodiments, the first message is encrypted using a symmetric key.

In embodiments, the first message is encrypted in accordance with Transport Layer Security protocol.

In embodiments, the first message is encrypted by the first user device.

In embodiments, the first message is encrypted by the digital asset exchange computer system.

In embodiments, the first transaction request is published via a secure channel.

In embodiments, the second transaction request is published via a secure channel.

In embodiments, the third transaction request is published via a secure channel.

In embodiments, the second blockchain is based on a mathematical protocol for proof of work.

In embodiments, the second blockchain is based on a mathematical protocol for proof of stake.

In embodiments, the second blockchain is based on a cryptographic mathematical protocol.

In embodiments, the method may further comprise a step of publishing, by the digital asset exchange computer system to a side ledger, transaction instructions associated with crediting the second amount of the second digital asset and the publishing step (d)(2) includes publishing the transaction instruction from the side ledger to the second distributed public asset ledger periodically or aperiodically.

In embodiments, the first electronic ledger is maintained and stored on the first plurality of geographically distributed computer systems in the first peer-to-peer network in the form of the first blockchain.

In embodiments, the first electronic ledger is maintained on a sidechain, separate from the first blockchain, wherein information on the sidechain is published and stored on the first blockchain periodically or aperiodically.

In embodiments, the second electronic ledger is maintained and stored on the second plurality of geographically distributed computer systems in the second peer-to-peer network in the form of the second blockchain.

In embodiments, the second electronic ledger is maintained on a sidechain, separate from the second blockchain, wherein information on the sidechain is published and stored on the second blockchain periodically or aperiodically.

In embodiments, the first electronic ledger and the second electronic ledger are maintained in separate databases.

In embodiments, the predetermined fixed ratio is one first digital asset for one second digital asset.

In embodiments, the predetermined fixed ratio is 100 first digital asset for one second digital asset.

In embodiments, a method may comprise the steps of: (a) authenticating, by a digital asset token issuer computer system associated with a digital asset token issuer, an access request by a first user device associated with a first user, to the digital asset token issuer computer system, wherein the digital asset token issuer computer system is operatively connected to one or more databases which include: i. a first electronic ledger associated with a first digital asset maintained on a first distributed public transaction ledger in the form of a first blockchain that is maintained by a first blockchain network including a first plurality of geographically distributed computer systems in a first peer-to-peer network; ii. a second electronic ledger associated with a second digital asset maintained on a second distributed public transaction ledger in the form of a second blockchain that is maintained by a second blockchain network including a second plurality of geographically distributed computer systems in a second peer-to-peer network, wherein a ratio of second digital asset to first digital asset is a predetermined fixed ratio, and wherein authenticating the access request received from the first user device comprises the steps of: (1) receiving, by the digital asset token issuer computer system from the first user device, an authentication request including first user credential information associated with the first user; (2) determining, by the digital asset token issuer computer system, that the first user device is authorized to access the digital asset token issuer computer system based at least in part on the first user credential information; (3) generating, by the digital asset token issuer computer system, first machine-executable instructions including first graphical user interface information associated with a first graphical user interface; (4) transmitting, from the digital asset token issuer computer system to the first user device, the first machine-executable instructions, wherein, upon execution of the first machine-executable instructions, the first user device displays the first graphical user interface; (b) receiving, by the digital asset computer system from the first user device, a first request to, in exchange for a first amount of the first digital asset, obtain a second amount of the second digital asset, comprising the steps of: (1) receiving, by the digital asset token issuer computer system from the first user device, the first request; (2) verifying, by the digital asset token issuer computer system, the first request by determining the first user has at least the first amount of the first digital asset based on reference to the first electronic ledger; (3) generating, by the digital asset token issuer computer system, a first transaction request including first instructions to generate a first designated public address on the first blockchain, wherein the digital asset token issuer computer system digitally signs the first transaction request with a first private key associated with the digital asset token issuer; (4) publishing, by the digital asset token issuer computer system, the first transaction request such that the first plurality of geographically distributed computer systems in the first peer-to-peer network verify the first transaction request and execute the first instructions by generating first designated address information including a first designated key pair associated with a first designated public address on the first blockchain; (5) obtaining, by the digital asset token issuer computer system based on reference to the first blockchain, first designated address information; (6) generating, by the digital asset token issuer computer system, a first message including instructions for the first user to transfer the first amount of the first digital asset to the first designated public address on the first blockchain; and (7) sending, by the digital asset token issuer computer system to the first user device, the first message; (c) confirming, by the digital asset token issuer computer system based on reference to the first blockchain, a first deposit of the first amount of the first digital asset by performing the steps of: (1) monitoring the first designated public address on the first blockchain; and (2) determining the first amount of the first digital asset was received at the first designated public address; (d) issuing, by the digital asset token issuer computer system, the second amount of the second digital asset by performing the steps of: (1) generating, by the digital asset token issuer computer system, a second transaction request including second instructions to: (i) transfer a third amount of the first digital asset from the first designated public address to a reserve public address on the first blockchain; (ii) transfer a fourth amount of the first digital asset from the first designated public address to a first exchange public address on the first blockchain, wherein the digital asset token issuer computer system digitally signs the second transaction request with a second private key associated with the digital asset token issuer; (2) publishing, by the digital asset token issuer computer system, the second transaction request such that the first plurality of geographically distributed computer systems in the first peer-to-peer network verify the second transaction request and execute the second instructions; (3) confirming, by the digital asset token issuer computer system, the second transaction request was executed based on reference to the first blockchain; (4) obtaining, by the digital asset token issuer computer system, first transaction information based on reference to the first blockchain, the first transaction information indicating the confirmed transfers of the first amount of the first digital asset, the third amount of the first digital asset, and the fourth amount of the first digital asset; (5) updating, by the digital asset token issuer computer system, the first electronic ledger to account for the second transaction request; (6) generating, by the digital asset token issuer computer system, a third transaction request including a second message comprising: (i) third instructions to print a fifth amount of the second digital asset to a second designated public address on the second blockchain, wherein the digital asset token issuer computer system digitally signs the third transaction request with a third private key associated with the digital asset token issuer, and wherein the fifth amount of the second digital asset is determined based on the predetermined fixed ration of the second digital asset to the first digital asset; and (ii) the first transaction information;

and (7) publishing, by the digital asset token issuer computer system to a first smart contract address on the second blockchain, the third transaction request, wherein the first smart contract address is associated with first smart contract instructions saved as part of the second blockchain and including: (i) verification instructions indicating conditions under which transaction requests published on the second blockchain and addressed to the first smart contract address are verified; and (ii) print instructions indicating conditions under which the second digital asset is issued to one or more public addresses on the second blockchain, wherein the third transaction request is verified in accordance with the verification instructions second designated public address on the second blockchain, and wherein the fifth amount of the second digital asset is printed in accordance with the print instructions; (e) confirming, by the digital asset token issuer computer system based on reference to the second blockchain, that the third transaction request was executed in accordance with the first smart contract instructions by performing the steps of: (1) monitoring the second designated public address on the second blockchain; and (2) determining the fifth amount of the second digital asset was received at the second designated public address; and (3) updating, by the digital asset token issuer computer system, the second electronic ledger to account for the fifth amount of the second digital asset being transferred to the second designated public address.

In embodiments, the second blockchain is the Ethereum network.

In embodiments, the first blockchain is the Bitcoin network.

In embodiments, the first blockchain is the Bitcoin Cash network.

In embodiments, the first blockchain is the Stellar network.

In embodiments, the first blockchain is the Filecoin network.

In embodiments, the first blockchain is the Litecoin network.

In embodiments, the first blockchain is the Tezos network.

In embodiments, the first blockchain is the Zcash network.

In embodiments, the first blockchain is the Neo network.

In embodiments, the first blockchain is the Ether Classic network.

In embodiments, the second blockchain is the Neo network.

In embodiments, the second blockchain is the Ether Classic network.

In embodiments, the digital signature is first transaction request include a digital signature generated using at least two private keys associated with the digital asset token issuer.

In embodiments, the first transaction information comprises information sufficient to indicate a plurality of transactions, including, for each respective transaction: i. respective transaction identification information including a respective transaction identifier associated with the respective transfer of a respective amount of the first digital asset to a respective designated public address; ii. a first respective public address; and iii. a second respective public address.

In embodiments, the first transaction request includes a first plurality of instructions, each associated with generating a respective designated public address associated with depositing the first digital asset, wherein the second transaction request includes a second plurality of instructions, each associated with transferring a respective reserve amount of the first digital asset to the reserve public address and a respective fee amount of the first digital asset to the first exchange public address, and wherein the third transaction request includes a third plurality of instructions, each associated with transferring a respective amount of the second digital asset to a respective digital address on the second blockchain.

In embodiments, the first transaction request is digitally signed with at least two private keys associated with the digital asset token issuer.

In embodiments, the second transaction request is digitally signed with at least two private keys associated with the digital asset token issuer.

In embodiments, the third transaction request is digitally signed with at least two private keys associated with the digital asset token issuer.

In embodiments, the first transaction request is published via a secure channel.

In embodiments, the second transaction request is published via a secure channel.

In embodiments, the third transaction request is published via a secure channel.

In embodiments, the first designated public address is unique to the first user.

In embodiments, the second designated public address is unique to the first user.

In embodiments, conditions under which transaction requests published on the second blockchain are verified in accordance with the verification instructions includes verifying a digital signature associated with published transaction requests such that the verified digital signature is associated with the digital asset token issuer.

In embodiments, the first transaction information associated with the second transaction request includes an identifier unique to the second transaction request.

In embodiments, the method may further comprise: (m) prior to determining the first amount of the first digital asset was received at the first designated public address, generating third-party monitoring information including the first designated public address; (n) sending, by the digital asset token issuer computer system to a third-party computer system associated with a third-party, the third-party monitoring information, wherein the third-party computer system monitors the first blockchain for one or more transactions associated with the first designated public address, wherein the third-party computer system determines the first amount of the first digital asset was received at the first designated public address, wherein the third-party computer system obtains the first transaction information, wherein the third-party computer system generates a notification indicating the obtained fist transaction information, and wherein the third-party computer system sends, to the digital asset token issuer computer system, the generated notification.

In embodiments, the notification is encrypted and sent via a secure channel.

In embodiments, the notification is encrypted by the third-party computer system.

In embodiments, the notification is encrypted communication.

In embodiments, the notification is encrypted using an asymmetric key.

In embodiments, the asymmetric key is a PKI key.

In embodiments, the notification is encrypted using a symmetric key.

In embodiments, the notification is encrypted in accordance with Transport Layer Security protocol.

In embodiments, the notification is encrypted by the digital asset token issuer computer system.

In embodiments, the authentication request is made by the first user device via a secure channel.

In embodiments, the authentication request is encrypted communication.

In embodiments, the authentication request is encrypted using an asymmetric key.

In embodiments, the asymmetric key is a PKI key.

In embodiments, the authentication request is encrypted using a symmetric key.

In embodiments, the authentication request is encrypted in accordance with Transport Layer Security protocol.

In embodiments, the authentication request is encrypted by the first user device.

In embodiments, the authentication request is encrypted by the digital asset token issuer computer system.

In embodiments, the first machine-executable instructions are transmitted by the digital asset token issuer computer system via a secure channel.

In embodiments, the first machine-executable instructions are encrypted communication.

In embodiments, the first machine-executable instructions are encrypted using an asymmetric key.

In embodiments, the asymmetric key is a PKI key.

In embodiments, the first machine-executable instructions are encrypted using a symmetric key.

In embodiments, the first machine-executable instructions are encrypted in accordance with Transport Layer Security protocol.

In embodiments, the first machine-executable instructions are encrypted by the first user device.

In embodiments, the first machine-executable instructions are encrypted by the digital asset token issuer computer system.

In embodiments, the first request is made by the first user device via a secure channel.

In embodiments, the first request is encrypted communication.

In embodiments, the first request is encrypted using an asymmetric key.

In embodiments, the asymmetric key is a PKI key.

In embodiments, the first request is encrypted using a symmetric key.

In embodiments, the first request is encrypted in accordance with Transport Layer Security protocol.

In embodiments, the first request is encrypted by the first user device.

In embodiments, the first request is encrypted by the digital asset token issuer computer system.

In embodiments, the first message is sent by the digital asset token issuer computer system via a secure channel.

In embodiments, the first message is encrypted communication.

In embodiments, the first message is encrypted using an asymmetric key.

In embodiments, the asymmetric key is a PKI key.

In embodiments, the first message is encrypted using a symmetric key.

In embodiments, the first message is encrypted in accordance with Transport Layer Security protocol.

In embodiments, the first message is encrypted by the first user device.

In embodiments, the first message is encrypted by the digital asset token issuer computer system.

In embodiments, the first transaction request is published via a secure channel.

In embodiments, the second transaction request is published via a secure channel.

In embodiments, the third transaction request is published via a secure channel.

In embodiments, the second blockchain is based on a mathematical protocol for proof of work.

In embodiments, the second blockchain is based on a mathematical protocol for proof of stake.

In embodiments, the second blockchain is based on a cryptographic mathematical protocol.

In embodiments, the method may further comprise a step of publishing, by the digital asset token issuer computer system to a side ledger, transaction instructions associated with crediting the second amount of the second digital asset and the publishing step (d)(2) includes publishing the transaction instruction from the side ledger to the second distributed public asset ledger periodically or aperiodically.

In embodiments, the first electronic ledger is maintained and stored on the first plurality of geographically distributed computer systems in the first peer-to-peer network in the form of the first blockchain.

In embodiments, the first electronic ledger is maintained on a sidechain, separate from the first blockchain, wherein information on the sidechain is published and stored on the first blockchain periodically or aperiodically.

In embodiments, the second electronic ledger is maintained and stored on the second plurality of geographically distributed computer systems in the second peer-to-peer network in the form of the second blockchain.

In embodiments, the second electronic ledger is maintained on a sidechain, separate from the second blockchain, wherein information on the sidechain is published and stored on the second blockchain periodically or aperiodically.

In embodiments, the first electronic ledger and the second electronic ledger are maintained in separate databases.

In embodiments, the predetermined fixed ratio is one first digital asset for one second digital asset.

In embodiments, the predetermined fixed ratio is 100 first digital asset for one second digital asset.

FIGS. 119B, 119B-1, and 119B-2, are flowcharts illustrating exemplary processes for redeeming (e.g., issuing) a second digital asset on a second underlying blockchain in exchange for a first digital asset on a first blockchain, where each issued second digital asset is held in a reserve as collateral for the first digital asset. As noted above, an exemplary system for issuing a second digital asset on a second blockchain and/or burning a first digital asset on a first blockchain is illustrated in connection with FIGS. 117A, 117A-1-117A-3, and 117B-1-117B-3 (collectively "FIG. 117"), the descriptions of the systems and components therein applying herein.

Unwrapping a digital asset (e.g., FILECOIN), in embodiments and referring to FIG. 119B, may begin with authenticating the first user at step S11902B. To "unwrap" a digital asset—e.g., issue a second digital asset in exchange for a first digital asset, redeem a stable value token (e.g., EFIL) on the first blockchain (e.g., ETHEREUM blockchain) pegged to a second digital asset on a different, second blockchain (e.g., FILECOIN on the FILECOIN network)—the first user via an associated first user device may generate and send an authentication request to the digital asset exchange computer system. The authentication request, in embodiments, may include credential information associated with the first user, which, in embodiments, may include one or more of the following: a username and password combination; biometric data associated with the first user (e.g., finger print, facial recognition identification, voice print, retinal scan, palm print, and/or a combination thereof, to name a few); personally identifiable information ("PII") associated with the first user; a telephone phone number associated with the first user (e.g., a mobile phone associated with the user device); a social security number associated with the first user; an e-mail address associated with the first user; an electronic mail address, a partial social security number, a government issued identification number, a shape, access card scan (e.g., swipe of a card associated with the exchange and having a magnetic strip), a pin (e.g., a number provided via SMS, other text message service, or email for multi-factor authentication), and/or a code, to name a few. In embodiments, the digital asset exchange computer system may utilize one or more protocols and/or programs to verify the authentication request (e.g., for security purposes). For example, the digital asset exchange computer system may utilize one or more of: encryption, point-to-point encryption, two-factor authentication, tokenization, login credentials, and/or a combination thereof, to name a few. In embodiments, the authentication request may be made from a smart phone application.

Upon receipt of the authentication request, in embodiments, the digital asset exchange computer system may verify the authentication request (e.g., verify the received user login credentials). In embodiments, verifying the first user's authentication request may include comparing the received login credentials with verified login credentials (e.g., credentials created by the first user and stored in memory 6102-C and/or memory 5302-C). If the authentication request is not verified, in embodiments, digital asset exchange computer system may generate and send a notification indicating the received authentication request was denied which may include information indicating one or more reasons the received authentication request was denied (e.g., incorrect password, unregistered device, time elapsing before a two-factor authentication request is completed, to name a few). In embodiments, the authentication request may be verified. In embodiments, the digital asset exchange computer system may utilize one or more protocols and/or programs to verify the authentication request (e.g., for security purposes). For example, the digital asset exchange computer system may utilize one or more of: encryption, point-to-point encryption, two-factor authentication, tokenization, login credentials, and/or a combination thereof, to name a few.

As described in connection with FIGS. 119A, 119A-1, 119A-2, 119B, 119B-1, and 119B-2, each message sent and/or received in embodiments, may be encrypted communication. The communication (e.g., message) may be encrypted by the sender and/or receiver of the message, in embodiments. Similarly, each message may be sent and/or received via a secure channel, such as an encrypted communication. For example, each message may be using an asymmetric key, such as a PKI key, or using a symmetric key, such as used in TLS, to name a few. Each message, in embodiments, may be encrypted by a sender and/or receiver of the message (e.g., first user device and/or digital asset exchange computer system). Similarly, each transaction request, in embodiments, may be digitally signed by the digital asset exchange computer system (e.g., using a private key associated with the digital asset exchange computer system system) and/or digitally signed by the digital asset exchange computer system and the first user device (e.g., via MPC). In embodiments, each instruction included within each transaction request may be encrypted and/or digitally signed using one or more private keys associated with the digital asset exchange computer system (and/or the First user device(s)). In embodiments, such a request and/or message may be via a secure channel, such as an encrypted communication. For example, the communication may be using an asymmetric key, such as a PKI key, or using a symmetric key, such as used in TLS, to name a few. The communication, in embodiments, may be encrypted by a first user device and/or an administrator (e.g., the digital asset exchange computer system 6102). For example, transactions and/or messages associated with the digital asset exchange computer system and/or the First user device(s) may be digitally signed by a private key associated with the first user and/or digital asset exchange (e.g., for MPC key sets). For example, a message sent by a first user device to the digital asset exchange computer system may include all or a portion of a private key associated with the first user device. The message, continuing the example, may be verified by confirming the private key is associated with the first user device (and/or a public address associated with the first user device and/or public key associated with the first user device). In embodiments, messages and/or transactions sent to and/or from the digital asset exchange computer system and/or first user device may be encrypted. Encryption, for example, may enhance the security of sent and/or published messages and/or transactions. For example, a message and/or transaction, when sent by a first user (e.g., the First user device(s)) to the digital asset exchange computer system, may be encrypted using Rivest, Shamir, & Aldeman (RSA) algorithm(s). As another example, a message and/or transaction, when published to the blockchain, may be encrypted using Twofish algorithm(s). In embodiments, messages and/or transactions sent between one or more parties and/or published to the blockchain may be encrypted in accordance with one or more of encryption algorithm(s), such as: Triple Data Encryption Standard (DES), RSA, Blowfish, Twofish, Advanced Encryption Standard (AES), and/or a combination thereof, to name a few. Further, messages and/or transactions sent between one or more parties and/or published to the blockchain may be encrypted, which may include one or more of the following techniques: character substitution, scrambling, mapping, hashing, and/or a combination thereof, to name a few. In embodiments, symmetric and or asymmetric encryption algorithms may be applied.

For example, one or more transactions and/or messages may be encrypted and/or decrypted by using and/or applying a cryptographic hash function of one or more of: the one or more messages, the one or more transactions, the public key(s) associated with the one or more messages and/or transactions, the private key(s) associated with the one or more messages and/or transactions, and/or a combination thereof, to name a few. A cryptographic hash function may be a hash function that is a mathematical algorithm which maps data of arbitrary size to a bit string of a fixed size (e.g., a hash). In embodiments, the cryptographic hash function may be designed to be a one-way function (e.g., a function that is infeasible to invert). The cryptographic hash function, may include one or more of the following prosperities: (1) deterministic such that the same message produces results in the same hash; (2) high speed, such that the hash value for a message is computed in a manner that does not slow the process down; (3) infeasible to generate a message from the hash, such that generating a message from the hash value would require attempting all possibilities (e.g., a brute force approach); and (4) unique, such that messages to not have the same hash value and/or small changes to a message alter the hash value such that the values do not correlate, to name a few.

Step S11902B, in embodiments, may be similar to the authentication processes described in connection with: step S11902A described in connection with FIGS. 119A, 119A-1, and 119A-2, step S1602 described in connection with FIGS. 16A-16B; step S1702 described in connection with FIGS. 17A-17B; step S4802 as described in connection with FIGS. 48A-48B; step S4902 as described in connection with FIG. 49A; and step S5004 as described in connection with FIG. 50A, the descriptions of each applying herein. In embodiments, the system(s) described in connection with FIGS. 117, 118, 119A, 119A-1, and 119A-2 may be similar to the system described herein, the descriptions of which applying herein. For example, the digital asset exchange computer system described in connection with the process(es) of FIGS. 119B, 119B-1, and 119B-2 may be similar to the digital asset exchange computer system described in connection with FIGS. 119A, 119A-1, and 119A-2.

The First User Device(s) and corresponding first user(s) may be associated with issuing and/or burning the first digital asset on the first blockchain 11712, each issued first digital asset backed by collateral on the second blockchain 11726 (e.g., the second digital asset (e.g., EFIL) on the second blockchain 11726). As described above, in embodiments, First User Device(s) may be on-boarded by the digital asset exchange 6110 via the digital asset exchange computer system 6102 (a more detailed description of which is located in connection with the description of FIG. 118, the description of which applying herein). As described in connection with FIG. 118, the on-boarding process of one or more First User Device(s) may include, in embodiments, obtaining one or more public addresses and associated public keys (e.g., the public key associated with the first keyset 11704C-1, the public key associated with the Nth keyset 11704NC-1). For example, one or more First User Device(s) may be associated with one or more public addresses (e.g., referring to FIG. 117, first user public address 11720 and/or second first user public address 11728, to name a few) which may be generated (e.g., by the digital asset exchange computer system 6102 via the first blockchain 11712) and/or received by the respective First User Device(s). The one or more public addresses may include public addresses for depositing and withdrawing one or more digital assets in connection with the processes described in connection with FIGS. 119A, 119A-1, 119A-2, 119B, 119B-1, and 119B-2. In embodiments, one or more of the aforementioned public addresses may be generated by a multi-party computation (MPC), similar to the MPCs described in below, the description of which applying herein.

In embodiments, the role of the digital asset exchange computer system in the processes described herein, may, in this context, be played by: a digital asset exchange computer system associated with a digital asset exchange (e.g., digital asset exchange computer system 5302 described in connection with FIGS. 53A-53E and 54A-54C, the descriptions of each applying herein), a digital asset token issuer computer system associated with a digital asset token issuer (e.g., the digital asset token issuer described in connection with FIGS. 39A-39E, FIGS. 14A-14T, the descriptions of each applying herein) and/or an administrator computer system associated with an administrator (e.g., administrator system 6801 described in connection with FIG. 24, the description of which applying herein), to name a few.

The process for redeeming a first digital asset on a first blockchain collateralized by a second digital asset on a second blockchain for the second digital asset may continue with step S11904B. At step S11904B, in embodiments, the digital asset exchange computer system may receive, from the first user device, a first request to obtain a second digital asset in exchange for a first digital asset. For example, the first request may include a request to redeem a first amount of the first digital asset for a second amount of the second digital asset. A more detailed description of step S11904B may be described in connection with FIG. 119B-1. Referring to FIG. 119B-1, in embodiments, at step S11904B-1, the digital asset exchange computer system may receive the first request from the first user device. Continuing the example, the first user via an associated first user device may generate and send an electronic request to the digital asset exchange computer system (e.g., digital asset exchange computer system 6102) associated with a digital asset exchange. In embodiments, such a request may be made via a secure channel, such as an encrypted communication. For example, the communication may be encrypted using an asymmetric key, such as a PKI key, or using a symmetric key, such as used in TLS, to name a few. The request, in embodiments, may be encrypted by the sender (e.g., a first user device associated with the first user) and/or the recipient (e.g., a digital asset exchange computer system computer system associated with a digital asset exchange), to name a few. The digital asset exchange computer system, continuing the example, may receive the electronic request from the first user (e.g., via a corresponding first user device).

The process of receiving the first request, in embodiments, may continue with step S11904B-2. At step S11904B-2, in embodiments, the digital asset exchange computer system may verify the first request. For example, the electronic request may include a request to redeem 10 EFIL (i.e., the first digital asset) for 10 FILECOIN (i.e., the second digital asset). Continuing the example, the digital asset exchange computer system may verify the electronic request by determining whether the first user has sufficient funds (e.g., the 10 EFIL) to complete the transaction. The determination of whether the first user has sufficient funds to complete the transaction, in embodiments, may be based on reference to an electronic ledger associated with the digital asset exchange computer system (e.g., first transaction ledger 115 and/or second transaction ledger 115-1, to name a few). Sufficient funds, in embodiments, may account for the first amount of the first digital asset and any associated fees with the request to redeem. For example, the request to issue 10 FILECOINS in exchange for redeeming EFIL may require a deposit of 11 EFIL-10 EFIL to redeem 10 FILECOINS and 1 EFIL for one or more fees associated with the redemption of the first digital asset (e.g., the issuance of the second amount of the second digital asset). If the electronic request is not verified, in embodiments, the digital asset exchange computer system may generate and send a notification indicating the electronic request was denied which may include information indicating one or more reasons the received electronic request was denied (e.g., insufficient funds, the first user is not authorized to complete the transaction, to name a few). In embodiments, the electronic request may be verified. In embodiments, the verification of the electronic request may be required to redeem the first digital asset on the first blockchain (e.g., EFIL on the ETHER network) for the second digital asset, the first digital asset being pegged to the second digital asset on a different, second blockchain (e.g., FILECOIN on the FILECOIN network). In embodiments, S11904B-2 may be similar to S11904A-2 described in connection with FIG. 119A-1 and/or may be similar to the description of step S77306, described in connection with FIG. 73A, the descriptions of which applying herein.

In embodiments, the process of receiving the first request may continue with step S11904B-3. At step S11904B-3, in embodiments, the digital asset exchange computer system may generate a first transaction request which may include first instructions to generate a first designated public address on the first blockchain 11712. In embodiments, in response to the received request (and/or in response to a verified received electronic request), in embodiments, the digital asset exchange computer system may generate a designated address on the first blockchain (e.g., ETHER network, first blockchain 11712, to name a few). For example, the digital asset exchange computer system may generate the first transaction request including the request to generate a public address. The transaction request, in embodiments, may be digitally signed by the digital asset exchange computer system based on a private key associated with the digital asset exchange. At step S11904A-4, in embodiments, the generated transaction request, may be published by the digital asset computer system via the first blockchain 11712 to a first plurality of geographically distributed computer systems associated with the first blockchain 11712. In embodiments, the generated transaction request may be addressed to a first smart contract (e.g., first smart contract 11714A, second smart contract 11716A, third smart contract 11718A, to name a few). For example, the first smart contract may include instructions saved as part of the first blockchain 11712. The instructions, in embodiments, may include address generation instructions. The address generation instructions, in embodiments, may indicate one or more conditions under which public addresses are generated. For example, as part of the on-boarding process (described in more detail in connection with FIG. 118, the description of which applying herein), the first smart contract associated with the first smart contract address 11714A may generate a designated public address (e.g., first user public address 11720, the intent to burn public address 11724, to name a few. For example, the first smart contract may generate a public address for each user. Continuing the example, the first smart contract may execute, via the first blockchain 11712, validation instructions to validate the first transaction request generate a designated public address for a first user. Once verified, continuing the example, a second smart contract (and/or the first smart contract) may execute address generation instructions, returning a generated public address associated with the first user. The transaction request, in embodiments, may be digitally signed by the digital asset exchange computer system (e.g., using a private key associated with the digital asset exchange computer system) and/or digitally signed by the digital asset exchange computer system and the first user device (e.g., via MPC).

Once published, the transaction request, in embodiments, may be verified and/or executed by the second plurality of geographically distributed computer systems. For example, the transaction request may be verified by a first smart contract (e.g., first smart contract 11714A). The first smart contract, in embodiments, may execute, via the first blockchain 11712, verification instructions to verify one or more of: the first transaction request, the digital signature of the first transaction request, and/or the public (and/or private key) associated with the transaction request (e.g., a public key associated with the digital asset exchange 6110). In embodiments, the verification instructions may verify whether the first user associated with the digital asset exchange computer system's first transaction request to generate a designated public address has the authority to request the issuance of the second amount of the second digital asset (e.g., FILECOIN). In embodiments, a verified transaction request may trigger a notification published to a public address (e.g., the first exchange public address 11722) of an intent to issue a second digital asset and/or burn an amount of the first digital asset based on the deposit of the first digital asset (e.g., EFIL). In embodiments, a verified transaction request may be executed and trigger the first smart contract to call a second smart contract (e.g., the second smart contract 11716A) instructing the second smart contract to publish a notification of an intent to issue the second digital asset (e.g., FILECOIN) based on the deposit of the first digital asset (e.g., EFIL). In embodiments, a verified transaction request may trigger a call to a third smart contract (e.g., third smart contract 11718A) instructing the third smart contract to store information from the message included with the first transaction request. For example, the third smart contract may store (1) information sufficient to indicate the first user is associated with the generated public address; (2) information sufficient to indicate one or more authorized devices associated with the first user; (3) a public address on the first blockchain associated with the first user; (4) a public key associated with the first user (e.g., corresponding to the first user public address 11720, the intent to burn public address 11724, and/or the second user public address 11728, to name a few); (5) a type of digital asset on the second blockchain 11726 (e.g., FILECOIN); (6) a first amount of the first digital asset; (7) a public address on the second blockchain to which the issued tokens are deposited (e.g., second user public address 11728); (8) a timestamp associated with the transaction request; (9) a timestamp associated with the execution and/or verification of the transaction request; and/or (10) a combination thereof, to name a few. The message and/or transaction request, in embodiments, may be encrypted and/or digitally signed by the administrator system (e.g., using a private key associated with the administrator system) and/or digitally signed by the administrator system and the first user device (e.g., via MPC). In embodiments, the second smart contract and/or the third smart contract may return, to the first smart contract, confirmation of the notification and/or storage respectively. The return, in embodiments, may be encrypted communication.

The execution of the first transaction request, in embodiments, may result with the generation of a public address on the first blockchain 11712—the first designated public address (e.g., intent to burn public address 11724). The generated first designated public address, in embodiments, may be one or more public addresses where digital assets to be burned as part of unwrapping a digital asset are deposited. In embodiments, as described above, the designated public address may have already been generated by the digital asset exchange (e.g., during an on-boarding process such as the process described in connection with FIG. 118). The first designated public address, in embodiments, may be associated with a key pair including a public and private key (which may be mathematically related to one another). The key pair, in embodiments, may be stored by the administrator computer system (e.g., in memory 6102-C). In embodiments, the first designated public address may be generated as part of the on-boarding process described in connection with FIG. 118, the description of which applying herein.

The process of receiving the first request, in embodiments, may continue with step S11904B-5. At step S11904B-5, in embodiments, the digital asset exchange computer system may obtain first designated public address information (e.g., information indicating the first designated public address—the intent to burn public address, the first designated key pair, the first user, a public address associated with the first user, and/or a combination thereof, to name a few). For example, the digital asset exchange computer system may generate and send a call to the first blockchain (e.g., to one or more smart contracts associated with generating the designated public address) to confirm the execution of the first transaction request. The first blockchain, in embodiments, may return first designated public address information which may be obtained and stored by the digital asset exchange computer system. In embodiments, a third-party computer system may monitor the first blockchain to confirm the execution of the first transaction request. The third-party computer system, in such embodiments, may notify the digital asset exchange computer system of the execution of the first transaction request and/or obtain and send, to the digital asset exchange computer system, the first designated public address information. In embodiments, such a notification or message including the first designated public address information may be made via a secure channel, such as an encrypted communication. For example, the communication may be encrypted using an asymmetric key, such as a PKI key, or using a symmetric key, such as used in TLS, to name a few. The communication, in embodiments, may be encrypted by the sender (e.g., the third-party computer system) and/or the recipient (e.g., the digital asset exchange computer system), to name a few.

The process of receiving the first request, in embodiments, may continue with step S11904B-6. At step S11904B-6, in embodiments, the digital asset exchange computer system may generate a first message including instructions to transfer the first amount of the first digital asset to the first designated public address on the first blockchain. The first message, in embodiments, may include machine-executable instructions which, when executed, display information on the first user device which indicate one or more instructions to transfer the first amount of the first digital asset to the first designated public address. In embodiments, continuing the above example, the digital asset exchange computer system may generate an electronic response to the first user's electronic request. The electronic response, in embodiments, may include instructions on how to transfer the first amount of first digital asset (e.g., 10 EFIL from a public address on the first blockchain to the intent to burn public address 11724 on the first blockchain). For example, the electronic response may include information sufficient to indicate that the first user is to deposit the first amount of fist digital asset into the first designated public address, which may be, in embodiments, represented by one or more of an alpha-numeric public address, and/or a QR code representation of the alpha-numeric public address, to name a few. In embodiments, such a message (the electronic response) may be sent via a secure channel, such as an encrypted communication. For example, the message may be encrypted using an asymmetric key, such as a PKI key, and/or using a symmetric key, such as used in TLS, to name a few. The message, in embodiments, may be encrypted by the sender (e.g., the digital asset exchange computer system) and/or the recipient (e.g., the first user device), to name a few. In embodiments, where, prior to the electronic request, the first user already has access to information indicating the first designated public address, it may not be necessary for the first user device to communicate with the digital asset exchange computer system (e.g., the electronic request) prior to depositing the first amount of the first digital asset into the first designated public address. Alternatively, in embodiments, the first user can instead transfer the desired amount of digital asset to be burned to unwrap an amount of the second digital asset directly to the first designated public address. At step S11904B-7, in embodiments, the first message may be sent by the digital asset exchange computer system to the first user device. In embodiments, such a message may be made via a secure channel, such as an encrypted communication. For example, the message may be encrypted using an asymmetric key, such as a PKI key, or using a symmetric key, such as used in TLS, to name a few. The communication, in embodiments, may be encrypted by the sender (e.g., the digital asset exchange computer system) and/or the recipient (e.g., the first user device), to name a few.

The first designated key pair associated with the first designated public address on the first blockchain may be similar to the first designated key pair described above in connection with FIGS. 119A, 119A-1, and 119A-2, the description of which applying herein. In embodiments, the first designated public address may be derived by using and/or applying a cryptographic hash function of the first designated public key. In embodiments, the first designated public address may be a result of the cryptographic hash function, or, in embodiments, at least a part of the result of the cryptographic hash function. A cryptographic hash function may be a hash function that is a mathematical algorithm which maps data of arbitrary size to a bit string of a fixed size (e.g., a hash). In embodiments, the cryptographic hash function may be designed to be a one-way function (e.g., a function that is infeasible to invert). The cryptographic hash function, may include one or more of the following prosperities. (1) deterministic such that the same message produces results in the same hash; (2) high speed, such that the hash value for a message is computed in a manner that does not slow the process down; (3) infeasible to generate a message from the hash, such that generating a message from the hash value would require attempting all possibilities (e.g. a brute force approach); and (4) unique, such that messages to not have the same hash value and/or small changes to a message alter the hash value such that the values do not correlate, to name a few. In embodiments, the first designated public address is derived from a multi-party computation. In embodiments, the first designated key pair is derived from a multi-party computation.

The first designated key pair (first keyset 11704-C-1), in embodiments, may be stored in memory (e.g., memory 6102-C) operatively connected to the digital asset exchange computer system 6102. In embodiments, the digital asset exchange computer system 6102 may transmit the first designated key pair to a first user device (e.g., first user device 11704 . . . Nth first user device 11704N). For example, the digital asset exchange computer system 6102 may generate the first designated key pair and transmit the first designated key pair to the first user device 11704. Continuing the example, the first designated key pair may be received by the first user device 11704 and stored in memory 11704-C.

The process for unwrapping a second digital asset (e.g., FILECOIN) with a first digital asset (e.g., EFIL), may continue with step S11906B. Referring back to FIG. 119B, in embodiments, at step S11906B, the digital asset exchange computer system may confirm that a first deposit of a first amount of the first digital asset occurred at the first designated public address (e.g., intent to burn public address 11724). In embodiments, the digital asset exchange computer system may monitor the first designated public address for activity (e.g., transactions). In embodiments, the first designated address may be monitored by (and/or on behalf of) the digital asset exchange associated with the digital asset exchange computer system. The digital asset exchange, in embodiments, may monitor the first designated public address continuously, in substantially real time, at predetermined intervals (e.g., at the end of a business day, every hour, twice a day, etc.), and/or aperiodically when requested, to name a few. In embodiments, the digital asset exchange may employ one or more third-parties (e.g., one or more watchtower systems) to monitor the first designated public address (and/or other public addresses associated with the issuance and/or burning of the digital asset tokens and/or other digital assets) for any activity (e.g., a published transaction, a published message, a published transaction intent, to name a few). To enable a third-party to monitor the first designated public address (and/or other public addresses associated with the unwrapping of the digital asset), the digital asset exchange may generate and transmit monitoring information (e.g., similar to the monitoring information described above in connection with FIGS. 119A, 119A-1, and 119A-2, the descriptions of which applying herein) to a third-party computer system associated with the one or more third-parties via network 125. In embodiments, the transmission would be via a secure transmission channel, such as an encrypted transmission using an asymmetric key (such as PKI) or a symmetric key (such as TLS) to name a few. The transmission, in embodiments, may be encrypted by the sender (e.g., the digital asset exchange computer system) and/or the recipient (e.g., the third-party system), to name a few.

As described above, the digital asset exchange computer system 6102 may employ one or more third-parties to monitor the first designated public address (and/or other public addresses associated with the deposit of the first digital asset for the purpose of issuing the second digital asset) for any activity (e.g. a published transaction, a published message—which may be digitally signed and/or encrypted in accordance with the descriptions herein, a published transaction intent, to name a few). To enable a third-party to monitor the first designated public address (and/or other public addresses associated with the issuance of the digital asset tokens), the digital asset exchange computer system 6102 may generate and transmit monitoring information to a third-party computer system associated with the third-party via network 125. The monitoring information may be included in a message, which, in embodiments, may be digitally signed by the digital asset exchange computer system (e.g., using a private key associated with the administrator system) and/or digitally signed by the digital asset exchange computer system, the third-party computer system and/or the first user device (e.g., via MPC). The monitoring information, in embodiments, may include one or more of the following: (1) the first designated public address (e.g., intent to burn public address 11724); (2) additional public addresses associated with the first user on the first blockchain; (3) the first exchange public address 11722; (4) the reserve public address 11732; and/or (5) a combination thereof, to name a few. In embodiments, the third-party computer system may monitor the blockchain (e.g., first blockchain 11712) for a published transaction associated with the first designated public address. This monitoring may be continuous, in substantially real time, and/or or at predetermined intervals, to name a few. For example, the third-party computer system may only check the first designated public address twice a day (e.g., by generating and sending a call to the second designated public address via the first blockchain 11712). If the third-party computer system detects a published transaction associated with the first designated public address, the third-party computer system may generate and send a notification to the digital asset exchange 6110. The notification, in embodiments, may indicate one or more of the following: (1) the published transaction; (2) a type of digital asset on the first blockchain 11726 (e.g., EFIL); (3) a first amount of the type of digital asset; (4) a public address on the second blockchain 11726 to which the issued digital assets (e.g., FILECOIN) are deposited; (5) an identifier associated with a first user (e.g., the first user associated with the first user device requesting the unwrapping of the type of digital asset); (6) a smart contract address associated with the smart contract responsible for burning the first amount of the first digital asset on the first blockchain 11712 (e.g., first smart contract 11714A, second smart contract 11716A, third smart contract 11718A, to name a few); (7) a public key associated with the first user (e.g., corresponding to one or more of the first user public address 11720 and/or the second user public address 11728); (8) a timestamp associated with the transaction request; (9) a source public address from which the deposit of the first amount of the first digital asset originated; and/or (10) a combination thereof, to name a few. In embodiments, the third-party computer system and components therein may be similar to the description of the digital asset exchange computer system 6102 and corresponding components, the descriptions of which applying herein.

Continuing the example, the first user via an associated first user device may generate a transaction request including instructions to transfer the first amount of first digital asset (e.g., 10 EFIL) from a public address associated with the first user on the first blockchain to the first designated public address (e.g., the intent to burn public address 11724) on the first blockchain. Continuing the example, the first user, via a corresponding first user device, may publish the generated transaction request on the first blockchain (e.g., first blockchain 11712). In embodiments, such publication will involve digitally signing the transaction request by a private key (or keys) associated the source public address (e.g., the public address associated with the first user) and/or sending a message that is digitally signed by a private key (or keys) associated the source public address (e.g., the public address associated with the first user) and include, as a recipient, at least the first designated public address. In embodiments, such a transaction request may be via a secure channel, such as an encrypted communication. For example, the communication may be using an asymmetric key, such as a PKI key, or using a symmetric key, such as used in TLS, to name a few. The communication, in embodiments, may be encrypted by the sender (e.g., the first user) and/or the recipient (e.g., one or more miners associated with the second blockchain), to name a few.

In embodiments, the transfer of the first amount of the first digital asset may automatically trigger a smart contract on the first blockchain (e.g., first smart contract 11714A, second smart contract 11716A, third smart contract 11718A, to name a few) to verify the first transaction request in accordance with verification instructions stored as part of the first blockchain 11712. In embodiments, a verified transaction may trigger a smart contract on the first blockchain (e.g., first smart contract 11714A, second smart contract 11716A, third smart contract 11718A, to name a few) to burn the first amount of the first digital asset in accordance with burn instructions saved as part of the first blockchain and associated with the first smart contract. The burn instructions, as described above, may indicate one or more conditions under which an amount of digital asset is burned. For example, a condition may be a verified transaction request from a verified user. As another example, the burn instructions may require a digital signature associated with a private key associated with the first user, the digital asset exchange, and/or a combination thereof.

For example, the transaction request may be verified by a first smart contract (e.g., first smart contract 11714A). The first smart contract, in embodiments, may execute, via the first blockchain 11712, validation instructions to verify the first transaction request and/or to validate the public key and/or private key associated with the transaction request (e.g., a public key associated with the source of the deposit and/or the private key associated with the source of the deposit, to name a few) have the authority to obtain a second digital asset in exchange for the deposited first digital asset. In embodiments, a verified transaction request may result in a notification published to a public address (e.g., the first user public address 11720, first exchange public address 11722, and/or intent to burn public address 11724, to name a few) of an intent to burn an amount of the first digital asset (e.g., based on the deposit of the first digital asset). In embodiments, a verified transaction request may be executed on the first blockchain and trigger the first smart contract to call a second smart contract (e.g., the second smart contract 11716A) to publish a notification of an intent to burn an amount of the first digital asset. In embodiments, a verified transaction request may trigger a call to a third smart contract (e.g., the third smart contract 11718A) to store information from the message included with the transaction request (e.g., information sufficient to identify the first user, the amount of digital asset deposited, the collateral tied to the amount of digital asset deposited, the reserve account associated with the collateral backing the digital asset deposited, to name a few). The communication (e.g., call and/or return), in embodiments, may be digitally signed by the digital asset exchange computer system (e.g., using a private key associated with the digital asset exchange computer system) and/or digitally signed by the digital asset exchange computer system and the first user device (e.g., via MPC). In embodiments, the third smart contract may store (1) information sufficient to indicate the second type of digital asset (e.g., the second digital asset, FILECOIN, to name a few) on the second blockchain 11726; (2) a first amount of the first type of digital asset (e.g., first digital asset, EFIL, to name a few) on the first blockchain 11712; (3) an identifier associated with a first user (e.g., the first user associated with the first user device requesting the burning of the type of digital asset); (5) a smart contract address associated with the smart contract responsible for burning the first amount of the first digital asset on the first blockchain 11712 (e.g., first smart contract 11714A, second smart contract 11716A, third smart contract 11718A, to name a few); (6) a public key associated with the first user; (7) a timestamp associated with the transaction request; (8) a timestamp associated with the execution and/or verification of the transaction request; and/or (9) a combination thereof, to name a few. The communication and/or messages, in embodiments, may be encrypted and/or digitally signed by the digital asset exchange computer system (e.g., using a private key associated with the digital asset exchange computer system) and/or digitally signed by the administrator system and the first user device (e.g., via MPC). In embodiments, the second smart contract and/or the third smart contract may return, to the first smart contract, confirmation of the notification and/or storage respectively. The communication, in embodiments, may be encrypted and/or digitally signed by the digital asset exchange computer system (e.g., using a private key associated with the digital asset exchange computer system) and/or digitally signed by the digital asset exchange computer system and the first user device (e.g., via MPC).

In embodiments, the digital asset exchange computer system may confirm the first amount of the first digital asset was transferred into the first designated public address by determining the first amount of the first digital asset was transferred to the first designated public address (e.g., the intent to burn public address 11724) (e.g., by generating and sending a call to the first designated public address via the first blockchain to confirm the first amount of the second digital asset is present at the first designated public address). The call, in embodiments, may result in a return from the first designated public address confirming the first user's deposit. In embodiments, the return may not confirm the first user's deposit. In such embodiments, the process described in connection with FIGS. 119A, 119A-1, and 119A-2 may end (and/or pause until a transaction can be confirmed). In embodiments, the digital asset exchange computer system may generate and send a message reminding the first user to deposit the second digital asset into the first designated public address to complete the request to wrap the first amount of the second digital asset. The message, in embodiments, may be generated and/or sent at once a predetermined amount of time has elapsed (e.g., an hour, a day, a week, a month, etc.). The predetermined amount of time, in embodiments, may be determined by the digital asset exchange computer system (e.g., as a default option) and/or determined by user preferences (e.g., associated with the first user). In embodiments, the generation and/or transmission of the message may be via a secure transmission channel, such as an encrypted transmission using an asymmetric key (such as PKI) or a symmetric key (such as TLS) to name a few. The generation and/or transmission, in embodiments, may be encrypted by the sender (e.g., the digital asset exchange computer system) and/or the recipient (e.g., the first user device), to name a few. In embodiments, the confirmed and/or detected transaction associated with the first designated public address may include a deposit from one user representing a plurality of deposits from a plurality of users.

In embodiments, the digital asset exchange computer system 6102 may verify the published transaction request. In embodiments, the published transaction request may be obtained and verified by the digital asset computer system 6102 (e.g., directly from the first blockchain and/or from a third-party monitoring system, to name a few). In embodiments where the digital asset exchange computer system 6102 obtains and verifies the published transaction request, the digital asset exchange computer system 6102 may generate and/or publish a transaction request to the first designated public address on the first blockchain. In embodiments, the digital asset exchange computer system 6102 may verify one or more of the following: (1) the digital signature associated with the transaction request is associated with an authorized first user; (2) an identifier associated with a first user is associated with an authorized first user; (3) a smart contract address associated with the smart contract responsible for burning the first amount of the type of digital asset is associated with an authorized first user; (4) a public key associated with the transaction request is associated with an authorized first user; (5) the format of the transaction request complies with one or more exchange format requirements; and/or (6) a combination thereof, to name a few. For example, the digital asset exchange computer system 6102 may verify the public key associated with the published transaction request is an authorized public key associated with a first user associated with the digital asset exchange computer system. The transaction request(s), in embodiments, may be digitally signed by the digital asset exchange computer system (e.g., using a private key associated with the digital asset exchange computer system) and/or digitally signed by the digital asset exchange computer system and the first user device (e.g., via MPC).

In embodiments, the published transaction may not be verified. In embodiments where the digital asset exchange computer system 6102 is unable to verify the published transaction request, a failed verification notification may be generated. In such embodiments, a failed verification notification may be generated by the digital asset exchange computer system 6102. The failed verification notification, in embodiments, may include one or more of the following: (1) the information that was not verified; (2) whether the first user may continue issuing tokens; and/or (3) options to cure the verification issue, to name a few. In embodiments, the digital asset exchange computer system 6102 may determine one or more solutions to cure the failed verification and include the one or more solutions with the failed verification notification. The failed verification notification, in embodiments, may be encrypted and/or digitally signed by the digital asset exchange computer system 6102 (e.g., using a private key associated with the administrator system) and/or digitally signed by the administrator system and the first user device (e.g., via MPC). In embodiments, an unverified transaction, in embodiments, may cause the first blockchain to generate and/or publish a failed verification notification (e.g., via a return). The published failed verification notification may be obtained by the first user device associated with the first user associated with the first transaction request. The published failed verification notification, in embodiments, may be encrypted and/or digitally signed by the digital asset exchange computer system 6102 (e.g., using a private key associated with the digital asset exchange computer system) and/or digitally signed by the digital asset exchange computer system 6102 and the first user device (e.g., via MPC).

In embodiments, the confirmation of a deposit of digital asset into the first designated public address (e.g., intent to burn public address 11724) may trigger an update of an electronic ledger to account for the deposit of digital asset. For example, the deposit of the first amount of the first digital asset may trigger an update of the first electronic ledger 115 to account for the deposit (transfer) of the first amount of the first digital asset into the first designated public address. In embodiments, the deposit of the first amount of the first digital asset (and/or the confirmation of a deposit into the first designated public address) may cause the digital asset exchange computer system to update a first electronic ledger (e.g., first electronic ledger 115) to account for the transfer of the first amount of first digital asset from a source public address associated with the first user to the first designated public address associated with the first user. For example, upon determining a transfer was made into the intent to burn public address, the digital asset exchange computer system may, in embodiments, be triggered to automatically (and/or periodically) update a transaction ledger (e.g., electronic ledger computer system 5158, first transaction ledger 115, and/or second transaction ledger 115-1) to account for the deposit into the intent to burn public address (and/or any fees associated with the deposit). The digital asset exchange computer system may update the electronic ledger via the first transaction ledger 115, the second transaction ledger 115-1, and/or the electronic ledger computer system 5158, which may be operatively connected to the digital asset exchange computer system 6102. The electronic ledger computer system 5158, in embodiments, may be a component of and/or stored in memory (e.g., memory 6102-C) operatively connected to the digital asset exchange computer system 6102.

In embodiments, the process of unwrapping a digital asset may continue with step S11908B. At step S11908B, in embodiments, the digital asset exchange computer system may issue a second amount of the second digital asset to a public address associated with the first user on the second blockchain (e.g., the second user public address 11728). For example, in exchange for the deposit of the first digital asset, the digital asset exchange may issue second digital asset held in a reserve to the first user. A more detailed explanation of the process of issuing a second amount of second digital asset, in embodiments, is located in the description of FIG. 119B-2.

Referring to FIG. 119B-2, in embodiments, the process for issuing the second amount of the second digital asset may begin with step S11908B-1. At step S11908B-1, in embodiments, the digital asset exchange computer system may generate a second transaction request to a first smart contract address on the first blockchain. In embodiments, the first transaction request may include instructions for the first smart contract to burn the first amount of the first digital asset. In embodiments, the second transaction request may include instructions to burn a first amount of the first digital asset (e.g., EFIL). The transaction request, in embodiments, may be digitally signed by the digital asset exchange computer system (e.g., using a private key associated with the digital asset exchange computer system) and/or digitally signed by the digital asset exchange computer system and the first user device (e.g., via MPC). In embodiments, the first designated public address may be separate from the intent to burn public address. In such embodiments, the second transaction request may include instructions to transfer the first amount of the first digital asset (e.g., EFIL) from a first public address (e.g., the first user public address 11720) to a first designated public address (e.g., the intent to burn public address 11724). In embodiments, the generated third transaction request may be encrypted and/or digitally signed (e.g., by the first user device and/or digital asset exchange computer system) in a similar manner as described above in connection with step S11908A-1, the description of which applying herein. The third transaction request, in embodiments, may include instructions to transfer a second amount of the first digital asset from the first public address (e.g., the second first user public address 11728) to a first designated public address (e.g., the intent to burn public address 11724) and to transfer a third amount of the first digital asset from the first public address (e.g., the second first user public address 11728) to a second public address (e.g., the first exchange public address 11722). The second amount, in embodiments may be the first amount of the first digital asset less a fee. The third amount, in embodiments, may be a fee associated with burning a digital asset on a first blockchain. In embodiments, the digital asset exchange computer system may burn digital asset tokens in exchange for some consideration such as an upfront fee (e.g., a set amount of digital math-based assets) and/or a payment of transaction fees (e.g., a fixed amount or set percentage of the transaction) from the first user associated with the request to issue second digital assets. In embodiments, digital assets in the form of a digital asset token, such as Gas, may be used to pay such fees. The generated transaction request, in embodiments at step S11908B-2, may be published via the blockchain (e.g., the first blockchain 11712). In embodiments, the generated transaction request may be published to the first smart contract address on the first blockchain.

In embodiments, the process of issuing the second digital asset may continue with step S11908B-3. At step S11908B-3, in embodiments, the digital asset exchange computer system may confirm the execution of the second transaction request on the first blockchain. In embodiments, to confirm execution of the second transaction request, the intent to burn public address and associated smart contracts (e.g., First Smart Contract 11714A, Second Smart Contract 11716A, and/or Third Smart Contract 11718A, to name a few) may be monitored by (and/or on behalf of) the digital asset exchange. For example, the intent to burn public address and the first smart contract may be monitored by (and/or on behalf of) the digital asset exchange (e.g., similar to the monitoring of step S11906A described above in connection with FIG. 119A, the description of which applying herein). In embodiments, to confirm execution of the second transaction request, the digital asset exchange computer system may generate, digitally sign, and publish a transaction request including a request for a total supply of the first digital asset associated with the first user on the first blockchain. The total supply, in embodiments where the second transaction request was executed, may be the total supply prior to the request to issue the second digital asset less the first amount of the first digital asset.

For example, the digital asset exchange computer system 6102 (and/or a third-party monitoring system) may confirm the second transaction request was executed by determining that the first amount of the first digital asset was burned. In embodiments, the digital asset exchange computer system 6102 (and/or a third-party monitoring system) may confirm the execution of the second transaction request by generating and/or sending a call to the first designated public address. The first designated public address may respond by generating and publishing a return to the first blockchain where the digital asset exchange computer system 6102 may obtain the return via network 125. The return, in embodiments, may confirm the execution of the second transaction request. In embodiments where the execution of the second transaction request is not confirmed, a failed confirmation notification may be generated (the failed confirmation notification, in embodiments, may be similar to the failed verification notification and/or the failed confirmation message described above, the description of which applying herein) and sent to the first user device. The message, in embodiments, may be encrypted and/or digitally signed by the administrator system (e.g., using a private key associated with the administrator system) and/or digitally signed by the administrator system and the first user device (e.g., via MPC). In embodiments, an unconfirmed transaction execution may trigger the first smart contract to call a smart contract to generate and/or publish a failed confirmation notification. The published failed confirmation notification may be obtained by the first user device associated with the second transaction request and/or by the digital asset exchange computer system. The call(s), return(s) and/or transaction request(s), in embodiments, may be digitally signed by the digital asset exchange computer system (e.g., using a private key associated with the digital asset exchange computer system) and/or digitally signed by the digital asset exchange computer system and the first user device (e.g., via MPC).

The process described in connection with FIG. 119B-2 may continue with step S11908B-4. In embodiments, at step S11908B-4, the digital asset exchange computer system may update a second electronic ledger to account for the execution of the second transaction request (e.g., to account for the burning of the first amount of the first digital asset). For example, upon determining the first amount of the first digital asset was burned, the digital asset exchange computer system may, in embodiments, be triggered to automatically (and/or periodically) update a transaction ledger (e.g., electronic ledger computer system 5158, first transaction ledger 115, and/or second transaction ledger 115-1) to account for the burning of the first digital asset. The digital asset exchange computer system may update the electronic ledger via the first transaction ledger 115, second transaction ledger 115-1, and/or the electronic ledger computer system 5158, which may be operatively connected to the digital asset exchange computer system 6102. The electronic ledger computer system 5158, in embodiments, may be a component of and/or stored in memory (e.g., memory 6102-C) operatively connected to the digital asset exchange computer system 6102.

In embodiments, the process of issuing the second amount of the second digital asset may continue with step S11908B-5. At step S11908B-5, in embodiments, the digital asset exchange computer system may generate a third transaction request to transfer a third amount of the second digital asset from a reserve public address to a second designated public address on a second blockchain and a fourth amount of the first digital asset from the reserve public address to an exchange public address on the second blockchain. The transaction request, in embodiments, may be digitally signed by the digital asset exchange computer system (e.g., using a private key associated with the digital asset exchange computer system) and/or digitally signed by the digital asset exchange computer system and the first user device (e.g., via MPC). The third transaction request, in embodiments, may include instructions to transfer a fourth amount of a second digital asset (e.g., the digital asset to which the burned first digital asset was pegged) from a reserve public address (e.g., reserve public address 11732 and/or second exchange public address 11730 to name a few) to a second designated public address (e.g., the second user public address 11728). In embodiments, the generated third transaction request may be encrypted and/or digitally signed (e.g., by the first user device and/or digital asset exchange computer system) in a similar manner as described in FIGS. 117, 118, 119A, 119A-1, 119A-2, 119B, 119B-1, 119B-2, and 120, the description of which applying herein.

The third transaction request, in embodiments, may include instructions to transfer a third amount of the second digital asset from a reserve public address (e.g., reserve public address 11732 and/or second exchange public address 11730 to name a few) to a second designated public address (e.g., the second user public address 11728 and/or another user selected public address on the second blockchain) and to transfer a fourth amount of the second digital asset from the reserve public address to an exchange public address (e.g., the second exchange public address 11730, the reserve public address 11730, to name a few). The third amount, in embodiments may correspond to the first amount of first digital asset less a fee associated with unwrapping a digital asset. The fourth amount, in embodiments, may be a fee associated with burning a digital asset (e.g., EFIL) on the first blockchain 11712, where the first digital asset is pegged to another digital asset (e.g., FILECOIN) on the second blockchain 11726. In embodiments, the digital asset exchange computer system 6102 (and/or one or more smart contracts) may determine the fourth amount of the second digital asset based on an exchange rate associated with the second digital asset (may be similar to the description of the use of exchange rates throughout this application, the descriptions of which applying herein). In embodiments, the digital asset computer system 6102 (and/or one or more smart contracts) may determine the third amount of the second digital asset and/or the fourth amount of the second digital asset based on predetermined rules (e.g., fees associated with the burning of digital asset tokens, which may be a value based on the amount of digital asset burned—by percentage and/or amount of the value associated with the second digital asset) and/or an exchange rate associated with the first digital asset (which may be similar to the description of the use of exchange rates throughout this application, the descriptions of which applying herein). In embodiments, the third amount of the second digital asset may be the second amount of the second digital asset. The second amount of the second digital asset, in embodiments, may be the sum of the third amount of second digital asset and the fourth amount of the second digital asset. The third transaction request, in embodiments, may be digitally signed by the digital asset exchange computer system (e.g., using a private key associated with the digital asset exchange computer system) and/or digitally signed by the digital asset exchange computer system and the first user device (e.g., via MPC). In embodiments, generating the third transaction request will involve digitally signing the transaction request by a private key (or keys) associated the source public address (e.g., the reserve public address) and/or sending a message that is digitally signed by a private key (or keys) associated the source public address (e.g., the reserve public address) and include, as a recipient, at least the second designated public address and/or the second exchange public address.

The third transaction request, in embodiments, may include instructions to transfer a portion of the second amount of the second digital asset from an offline reserve to an address on the second blockchain (e.g., the reserve public address 11732). In embodiments, an off-line reserve (e.g., Reserve(s) 11734) may hold one or more of the second digital assets transferred from the first designated public address to collateralize the first digital assets issued therefrom. The system described in connection with FIGS. 117A, 117B-1, 117B-2, 117B-3, 117C-1, 117C-2, 117C-3, 119A, 119A-1, 119A-2, 119B, 119B-1, and 119B-2, may also include one or more off-line keyset 1803, . . . 1803N as a reserve for digital assets backing digital asset tokens (e.g., EFIL) issued on the first blockchain 11712. Each keyset may include a private key and a corresponding public key (or public address on the blockchain). The offline keyset 1803 may be stored in on non-volatile computer readable memory of one or more computer systems that are physically separated from network 125, the blockchain, administrator system, and/or the one or more computer systems that store the on-line keysets, such as an additional computer system. In embodiments, the second computer system that is physically separated and/or electronically may be a hardware storage module (HSM 1900—as described more fully in connection with FIG. 13B). The physical and/or electronic separation may serve as an additional security measure(s), protecting the one or more off-line keyset 1803, . . . 1803N from unauthorized access of reserves of digital assets (e.g., FILECOIN) backing digital asset tokens (e.g., EFIL) issued by the digital asset exchange computer system (e.g., digital asset exchange computer system 6102). In embodiments, the one or more off-line keysets may be associated with address on the first blockchain 11712 and/or the second blockchain 11726.

The third transaction request, in embodiments, at step S11908B-6 may be published by the digital asset exchange computer system. In embodiments, such a transaction request may be via a secure channel, such as an encrypted communication. For example, the communication may be using an asymmetric key, such as a PKI key, or using a symmetric key, such as used in TLS, to name a few. The communication, in embodiments, may be encrypted by the sender (e.g., the first user) and/or the recipient (e.g., one or more miners associated with the second blockchain), to name a few.

Referring back to FIG. 119B, in embodiments, the process for unwrapping a digital asset may continue with step S11910B. At step S11910B, in embodiments, the digital asset exchange computer system may confirm the issuance of the second amount of the second digital asset.

In embodiments, the digital asset exchange computer system 6102 (and/or a third-party monitoring system) may confirm the third transaction request was executed. For example, the execution of the third transaction request may be confirmed by determining that the third amount of the second digital asset (e.g., FILECOIN) was transferred from the reserve public address to the second designated public address. As another example, the execution of the third transaction request may be confirmed by determining that the fourth amount of the second digital asset was transferred from the reserve public address to the second exchange public address. In embodiments, the digital asset exchange computer system 6102 (and/or a third-party monitoring system) may confirm the execution of the first transaction by generating and/or sending a call to the second designated public address (the reserve public address, and/or the second exchange public address) via network 125. The second designated public address (the reserve public address, and/or the second exchange public address) may respond by generating and publishing a return which may be accessible to the digital asset exchange computer system 6102 via network 125. The return, in embodiments, may confirm the execution of the third transaction request. The return, in embodiments, may also confirm that the third transaction request was verified. In embodiments where the execution of the third transaction request is not confirmed, a failed confirmation notification may be generated (the failed confirmation notification, in embodiments, may be similar to the failed verification notification described above, the description of which applying herein).

In embodiments, the digital asset exchange computer system 6102 may update a second electronic ledger (e.g., second electronic ledger 115-1) to account for the transfer of the second digital asset (e.g., FILECOIN) from the reserve to a public address associated with the first user and/or the transfer of the second digital asset from the reserve to an exchange public address associated with the digital asset exchange. In embodiments, the digital asset exchange computer system 6102 may update the electronic ledger via the electronic ledger computer system 5158, first transaction ledger 115 and/or second transaction ledger 115-1, to name a few. In embodiments, the electronic ledger computer system 5158 may be operatively connected to the digital asset exchange computer system 6102. The electronic ledger computer system 5158, in embodiments, may be a component of and/or stored in memory (e.g., memory 6102-C) operatively connected to the digital asset exchange computer system 6102.

In embodiments, the communications (including messages, transaction requests, instructions, calls, and/or returns, to name a few) may be encrypted and/or digitally signed by the sender of the communication and/or the recipient of the communication. The steps of the process described in connection with FIGS. 119B, 119B-1, and 119B-2 may be rearranged or omitted.

In embodiments, a method may comprise the steps of: (a) authenticating, by an administrator computer system associated with an administrator, an access request by a first user device associated with a first user, to the administrator computer system, wherein the administrator computer system is operatively connected to one or more databases which include: i. a first electronic ledger associated with a first digital asset maintained on a first distributed public transaction ledger in the form of a first blockchain that is maintained by a first blockchain network including a first plurality of geographically distributed computer systems in a first peer-to-peer network; ii. a second electronic ledger associated with a second digital asset maintained on a second distributed public transaction ledger in the form of a second blockchain that is maintained by a second blockchain network including a second plurality of geographically distributed computer systems in a second peer-to-peer network, wherein a ratio of second digital asset to first digital asset is a predetermined fixed ratio, and wherein authenticating the access request received from the first user device comprises the steps of: (1) receiving, by the administrator computer system from the first user device, an authentication request including first user credential information associated with the first user; (2) determining, by the administrator computer system, that the first user device is authorized to access the administrator computer system based at least in part on the first user credential information; (3) generating, by the administrator computer system, first machine-executable instructions including first graphical user interface information associated with a first graphical user interface; (4) transmitting, from the administrator computer system to the first user device, the first machine-executable instructions, wherein, upon execution of the first machine-executable instructions, the first user device displays the first graphical user interface; (b) receiving, by the digital asset computer system from the first user device, a first request to obtain a first amount of the first digital asset in exchange for a second amount of the second digital asset, comprising the steps of: (1) receiving, by the administrator computer system from the first user device, the first request; (2) verifying, by the administrator computer system, the first request by determining the first user has at least the second amount of the second digital asset based on reference to the second electronic ledger; (3) generating, by the administrator computer system, a first transaction request including first instructions to generate a first designated public address on the second blockchain, wherein the administrator computer system digitally signs the first transaction request with a first private key associated with the administrator; (4) publishing, by the administrator computer system, the first transaction request such that the second plurality of geographically distributed computer systems in the second peer-to-peer network verify the first transaction request and execute the first instructions by generating first designated address information including a first designated key pair associated with a first designated public address on the second blockchain; (5) obtaining, by the administrator computer system based on reference to the second blockchain, first designated address information; (6) generating, by the administrator computer system, a first message including instructions for the first user to transfer the second amount of the second digital asset to the first designated public address on the second blockchain; and (7) sending, by the administrator computer system to the first user device, the first message; (c) confirming, by the administrator computer system based on reference to the second blockchain, a first deposit of the second amount of the second digital asset by performing the steps of: (1) monitoring the first designated public address on the second blockchain; and (2) determining the second amount of the second digital asset was received at the first designated public address; (d) issuing, by the administrator computer system, the first amount of the first digital asset by performing the steps of: (1) generating, by the administrator computer system, a second transaction request including a second message comprising second instructions to: (i) transfer the second amount of the second digital asset from the first designated public address to a first smart contract address on the second blockchain; and (ii) burn the second amount of the second digital asset; wherein the first smart contract address is associated with first smart contract instructions saved as part of the second blockchain and including: (i) verification instructions indicating conditions under which transaction requests published on the second blockchain and addressed to the first smart contract address are verified; and (ii) burn instructions indicating conditions under which the second digital asset is burned, and wherein the administrator computer system digitally signs the second transaction request with a second private key associated with the administrator; (2) publishing, by the administrator computer system to the first smart contract address on the second blockchain, the second transaction; (3) confirming, by the administrator computer system, the second transaction request was executed based on reference to the second blockchain; (4) updating, by the administrator computer system, the second electronic ledger to account for the second transaction request; (5) generating, by the administrator computer system, a third transaction request including third instructions to: (i) transfer a third amount of the first digital asset from a reserve public address on the first blockchain to a second designated public address on the first blockchain; and (ii) transfer a fourth amount of the first digital asset from the reserve public address to an exchange public address associated with the administrator, wherein the administrator computer system digitally signs the third transaction request with a third private key associated with the administrator; and (6) publishing, by the administrator computer system to the first blockchain, the third transaction request; and (e) confirming, by the administrator computer system based on reference to the first blockchain, that the third transaction request was executed by performing the steps of: (1) monitoring the second designated public address on the first blockchain; and (2) determining the third amount of the first digital asset was received at the second designated public address; and (3) updating, by the administrator computer system, the first electronic ledger to account for the third transaction request.

In embodiments, the second blockchain is the Ethereum network.

In embodiments, the first blockchain is the Bitcoin network.

In embodiments, the first blockchain is the Bitcoin Cash network.

In embodiments, the first blockchain is the Stellar network.

In embodiments, the first blockchain is the Filecoin network.

In embodiments, the first blockchain is the Litecoin network.

In embodiments, the first blockchain is the Tezos network.

In embodiments, the first blockchain is the Zcash network.

In embodiments, the first blockchain is the Neo network.

In embodiments, the first blockchain is the Ether Classic network.

In embodiments, the second blockchain is the Neo network.

In embodiments, the second blockchain is the Ether Classic network.

In embodiments, the digital signature is first transaction request include a digital signature generated using at least two private keys associated with the administrator.

In embodiments, the first transaction information comprises information sufficient to indicate a plurality of transactions, including, for each respective transaction: i. respective transaction identification information including a respective transaction identifier associated with the respective transfer of a respective amount of the first digital asset to a respective designated public address; ii. a first respective public address; and iii. a second respective public address.

In embodiments, the first transaction request includes a first plurality of instructions, each associated with generating a respective designated public address associated with depositing the first digital asset, wherein the second transaction request includes a second plurality of instructions, each associated with transferring a respective reserve amount of the first digital asset to the reserve public address and a respective fee amount of the first digital asset to the first exchange public address, and wherein the third transaction request includes a third plurality of instructions, each associated with transferring a respective amount of the second digital asset to a respective digital address on the second blockchain.

In embodiments, the first transaction request is digitally signed with at least two private keys associated with the administrator.

In embodiments, the second transaction request is digitally signed with at least two private keys associated with the administrator.

In embodiments, the third transaction request is digitally signed with at least two private keys associated with the administrator.

In embodiments, the first transaction request is published via a secure channel.

In embodiments, the second transaction request is published via a secure channel.

In embodiments, the third transaction request is published via a secure channel.

In embodiments, the first designated public address is unique to the first user.

In embodiments, the second designated public address is unique to the first user.

In embodiments, conditions under which transaction requests published on the second blockchain are verified in accordance with the verification instructions includes verifying a digital signature associated with published transaction requests such that the verified digital signature is associated with the administrator.

In embodiments, the first transaction information associated with the second transaction request includes an identifier unique to the second transaction request.

In embodiments, the method may further comprise: (m) prior to determining the first amount of the first digital asset was received at the first designated public address, generating third-party monitoring information including the first designated public address; (n) sending, by the administrator computer system to a third-party computer system associated with a third-party, the third-party monitoring information, wherein the third-party computer system monitors the first blockchain for one or more transactions associated with the first designated public address, wherein the third-party computer system determines the first amount of the first digital asset was received at the first designated public address, wherein the third-party computer system obtains the first transaction information, wherein the third-party computer system generates a notification indicating the obtained fist transaction information, and wherein the third-party computer system sends, to the administrator computer system, the generated notification.

In embodiments, the notification is encrypted and sent via a secure channel.

In embodiments, the notification is encrypted by the third-party computer system.

In embodiments, the notification is encrypted communication.

In embodiments, the notification is encrypted using an asymmetric key.

In embodiments, the asymmetric key is a PKI key.

In embodiments, the notification is encrypted using a symmetric key.

In embodiments, the notification is encrypted in accordance with Transport Layer Security protocol.

In embodiments, the notification is encrypted by the administrator computer system.

In embodiments, the authentication request is made by the first user device via a secure channel.

In embodiments, the authentication request is encrypted communication.

In embodiments, the authentication request is encrypted using an asymmetric key.

In embodiments, the asymmetric key is a PKI key.

In embodiments, the authentication request is encrypted using a symmetric key.

In embodiments, the authentication request is encrypted in accordance with Transport Layer Security protocol.

In embodiments, the authentication request is encrypted by the first user device.

In embodiments, the authentication request is encrypted by the administrator computer system.

In embodiments, the first machine-executable instructions are transmitted by the administrator computer system via a secure channel.

In embodiments, the first machine-executable instructions are encrypted communication.

In embodiments, the first machine-executable instructions are encrypted using an asymmetric key.

In embodiments, the asymmetric key is a PKI key.

In embodiments, the first machine-executable instructions are encrypted using a symmetric key.

In embodiments, the first machine-executable instructions are encrypted in accordance with Transport Layer Security protocol.

In embodiments, the first machine-executable instructions are encrypted by the first user device.

In embodiments, the first machine-executable instructions are encrypted by the administrator computer system.

In embodiments, the first request is made by the first user device via a secure channel.

In embodiments, the first request is encrypted communication.

In embodiments, the first request is encrypted using an asymmetric key.

In embodiments, the asymmetric key is a PKI key.

In embodiments, the first request is encrypted using a symmetric key.

In embodiments, the first request is encrypted in accordance with Transport Layer Security protocol.

In embodiments, the first request is encrypted by the first user device.

In embodiments, the first request is encrypted by the administrator computer system.

In embodiments, the first message is sent by the administrator computer system via a secure channel.

In embodiments, the first message is encrypted communication.

In embodiments, the first message is encrypted using an asymmetric key.

In embodiments, the asymmetric key is a PKI key.

In embodiments, the first message is encrypted using a symmetric key.

In embodiments, the first message is encrypted in accordance with Transport Layer Security protocol.

In embodiments, the first message is encrypted by the first user device.

In embodiments, the first message is encrypted by the administrator computer system.

In embodiments, the first transaction request is published via a secure channel.

In embodiments, the second transaction request is published via a secure channel.

In embodiments, the third transaction request is published via a secure channel.

In embodiments, the second blockchain is based on a mathematical protocol for proof of work.

In embodiments, the second blockchain is based on a mathematical protocol for proof of stake.

In embodiments, the second blockchain is based on a cryptographic mathematical protocol.

In embodiments, the method may further comprise a step of publishing, by the administrator computer system to a side ledger, transaction instructions associated with crediting the second amount of the second digital asset and the publishing step (d)(2) includes publishing the transaction instruction from the side ledger to the second distributed public asset ledger periodically or aperiodically.

In embodiments, the first electronic ledger is maintained and stored on the first plurality of geographically distributed computer systems in the first peer-to-peer network in the form of the first blockchain.

In embodiments, the first electronic ledger is maintained on a sidechain, separate from the first blockchain, wherein information on the sidechain is published and stored on the first blockchain periodically or aperiodically.

In embodiments, the second electronic ledger is maintained and stored on the second plurality of geographically distributed computer systems in the second peer-to-peer network in the form of the second blockchain.

In embodiments, the second electronic ledger is maintained on a sidechain, separate from the second blockchain, wherein information on the sidechain is published and stored on the second blockchain periodically or aperiodically.

In embodiments, the first electronic ledger and the second electronic ledger are maintained in separate databases.

In embodiments, the predetermined fixed ratio is one first digital asset for one second digital asset.

In embodiments, the predetermined fixed ratio is 100 first digital asset for one second digital asset.

In embodiments, a method may comprise the steps of: (a) authenticating, by a digital asset exchange computer system associated with a digital asset exchange, an access request by a first user device associated with a first user, to the digital asset exchange computer system, wherein the digital asset exchange computer system is operatively connected to one or more databases which include: i. a first electronic ledger associated with a first digital asset maintained on a first distributed public transaction ledger in the form of a first blockchain that is maintained by a first blockchain network including a first plurality of geographically distributed computer systems in a first peer-to-peer network; ii. a second electronic ledger associated with a second digital asset maintained on a second distributed public transaction ledger in the form of a second blockchain that is maintained by a second blockchain network including a second plurality of geographically distributed computer systems in a second peer-to-peer network, wherein a ratio of second digital asset to first digital asset is a predetermined fixed ratio, and wherein authenticating the access request received from the first user device comprises the steps of: (1) receiving, by the digital asset exchange computer system from the first user device, an authentication request including first user credential information associated with the first user; (2) determining, by the digital asset exchange computer system, that the first user device is authorized to access the digital asset exchange computer system based at least in part on the first user credential information; (3) generating, by the digital asset exchange computer system, first machine-executable instructions including first graphical user interface information associated with a first graphical user interface; (4) transmitting, from the digital asset exchange computer system to the first user device, the first machine-executable instructions, wherein, upon execution of the first machine-executable instructions, the first user device displays the first graphical user interface; (b) receiving, by the digital asset computer system from the first user device, a first request to obtain a first amount of the first digital asset in exchange for a second amount of the second digital asset, comprising the steps of: (1) receiving, by the digital asset exchange computer system from the first user device, the first request; (2) verifying, by the digital asset exchange computer system, the first request by determining the first user has at least the second amount of the second digital asset based on reference to the second electronic ledger; (3) generating, by the digital asset exchange computer system, a first transaction request including first instructions to generate a first designated public address on the second blockchain, wherein the digital asset exchange computer system digitally signs the first transaction request with a first private key associated with the digital asset exchange; (4) publishing, by the digital asset exchange computer system, the first transaction request such that the second plurality of geographically distributed computer systems in the second peer-to-peer network verify the first transaction request and execute the first instructions by generating first designated address information including a first designated key pair associated with a first designated public address on the second blockchain; (5) obtaining, by the digital asset exchange computer system based on reference to the second blockchain, first designated address information; (6) generating, by the digital asset exchange computer system, a first message including instructions for the first user to transfer the second amount of the second digital asset to the first designated public address on the second blockchain; and (7) sending, by the digital asset exchange computer system to the first user device, the first message; (c) confirming, by the digital asset exchange computer system based on reference to the second blockchain, a first deposit of the second amount of the second digital asset by performing the steps of: (1) monitoring the first designated public address on the second blockchain; and (2) determining the second amount of the second digital asset was received at the first designated public address; (d) issuing, by the digital asset exchange computer system, the first amount of the first digital asset by performing the steps of: (1) generating, by the digital asset exchange computer system, a second transaction request including a second message comprising second instructions to: (i) transfer the second amount of the second digital asset from the first designated public address to a first smart contract address on the second blockchain; and (ii) burn the second amount of the second digital asset; wherein the first smart contract address is associated with first smart contract instructions saved as part of the second blockchain and including: (i) verification instructions indicating conditions under which transaction requests published on the second blockchain and addressed to the first smart contract address are verified; and (ii) burn instructions indicating conditions under which the second digital asset is burned, and wherein the digital asset exchange computer system digitally signs the second transaction request with a second private key associated with the digital asset exchange; (2) publishing, by the digital asset exchange computer system to the first smart contract address on the second blockchain, the second transaction; (3) confirming, by the digital asset exchange computer system, the second transaction request was executed based on reference to the second blockchain; (4) updating, by the digital asset exchange computer system, the second electronic ledger to account for the second transaction request; (5) generating, by the digital asset exchange computer system, a third transaction request including third instructions to: (i) transfer a third amount of the first digital asset from a reserve public address on the first blockchain to a second designated public address on the first blockchain; and (ii) transfer a fourth amount of the first digital asset from the reserve public address to an exchange public address associated with the digital asset exchange, wherein the digital asset exchange computer system digitally signs the third transaction request with a third private key associated with the digital asset exchange; and (6) publishing, by the digital asset exchange computer system to the first blockchain, the third transaction request; and (e) confirming, by the digital asset exchange computer system based on reference to the first blockchain, that the third transaction request was executed by performing the steps of: (1) monitoring the second designated public address on the first blockchain; and (2) determining the third amount of the first digital asset was received at the second designated public address; and (3) updating, by the digital asset exchange computer system, the first electronic ledger to account for the third transaction request.

In embodiments, the second blockchain is the Ethereum network.

In embodiments, the first blockchain is the Bitcoin network.

In embodiments, the first blockchain is the Bitcoin Cash network.

In embodiments, the first blockchain is the Stellar network.

In embodiments, the first blockchain is the Filecoin network.

In embodiments, the first blockchain is the Litecoin network.

In embodiments, the first blockchain is the Tezos network.

In embodiments, the first blockchain is the Zcash network.

In embodiments, the first blockchain is the Neo network.

In embodiments, the first blockchain is the Ether Classic network.

In embodiments, the second blockchain is the Neo network.

In embodiments, the second blockchain is the Ether Classic network.

In embodiments, the digital signature is first transaction request include a digital signature generated using at least two private keys associated with the digital asset exchange.

In embodiments, the first transaction information comprises information sufficient to indicate a plurality of transactions, including, for each respective transaction: i. respective transaction identification information including a respective transaction identifier associated with the respective transfer of a respective amount of the first digital asset to a respective designated public address; ii. a first respective public address; and iii. a second respective public address.

In embodiments, the first transaction request includes a first plurality of instructions, each associated with generating a respective designated public address associated with depositing the first digital asset, wherein the second transaction request includes a second plurality of instructions, each associated with transferring a respective reserve amount of the first digital asset to the reserve public address and a respective fee amount of the first digital asset to the first exchange public address, and wherein the third transaction request includes a third plurality of instructions, each associated with transferring a respective amount of the second digital asset to a respective digital address on the second blockchain.

In embodiments, the first transaction request is digitally signed with at least two private keys associated with the digital asset exchange.

In embodiments, the second transaction request is digitally signed with at least two private keys associated with the digital asset exchange.

In embodiments, the third transaction request is digitally signed with at least two private keys associated with the digital asset exchange.

In embodiments, the first transaction request is published via a secure channel.

In embodiments, the second transaction request is published via a secure channel.

In embodiments, the third transaction request is published via a secure channel.

In embodiments, the first designated public address is unique to the first user.

In embodiments, the second designated public address is unique to the first user.

In embodiments, conditions under which transaction requests published on the second blockchain are verified in accordance with the verification instructions includes verifying a digital signature associated with published transaction requests such that the verified digital signature is associated with the digital asset exchange.

In embodiments, the first transaction information associated with the second transaction request includes an identifier unique to the second transaction request.

In embodiments, the method may further comprise: (m) prior to determining the first amount of the first digital asset was received at the first designated public address, generating third-party monitoring information including the first designated public address; (n) sending, by the digital asset exchange computer system to a third-party computer system associated with a third-party, the third-party monitoring information, wherein the third-party computer system monitors the first blockchain for one or more transactions associated with the first designated public address, wherein the third-party computer system determines the first amount of the first digital asset was received at the first designated public address, wherein the third-party computer system obtains the first transaction information, wherein the third-party computer system generates a notification indicating the obtained fist transaction information, and wherein the third-party computer system sends, to the digital asset exchange computer system, the generated notification.

In embodiments, the notification is encrypted and sent via a secure channel.

In embodiments, the notification is encrypted by the third-party computer system.

In embodiments, the notification is encrypted communication.

In embodiments, the notification is encrypted using an asymmetric key.

In embodiments, the asymmetric key is a PKI key.

In embodiments, the notification is encrypted using a symmetric key.

In embodiments, the notification is encrypted in accordance with Transport Layer Security protocol.

In embodiments, the notification is encrypted by the digital asset exchange computer system.

In embodiments, the authentication request is made by the first user device via a secure channel.

In embodiments, the authentication request is encrypted communication.

In embodiments, the authentication request is encrypted using an asymmetric key.

In embodiments, the asymmetric key is a PKI key.

In embodiments, the authentication request is encrypted using a symmetric key.

In embodiments, the authentication request is encrypted in accordance with Transport Layer Security protocol.

In embodiments, the authentication request is encrypted by the first user device.

In embodiments, the authentication request is encrypted by the digital asset exchange computer system.

In embodiments, the first machine-executable instructions are encrypted communication.

In embodiments, the first machine-executable instructions are encrypted using an asymmetric key.

In embodiments, the asymmetric key is a PKI key.

In embodiments, the first machine-executable instructions are encrypted using a symmetric key.

In embodiments, the first machine-executable instructions are encrypted in accordance with Transport Layer Security protocol.

In embodiments, the first machine-executable instructions are encrypted by the first user device.

In embodiments, the first machine-executable instructions are encrypted by the digital asset exchange computer system.

In embodiments, the first request is made by the first user device via a secure channel.

In embodiments, the first request is encrypted communication.

In embodiments, the first request is encrypted using an asymmetric key.

In embodiments, the asymmetric key is a PKI key.

In embodiments, the first request is encrypted using a symmetric key.

In embodiments, the first request is encrypted in accordance with Transport Layer Security protocol.

In embodiments, the first request is encrypted by the first user device.

In embodiments, the first request is encrypted by the digital asset exchange computer system.

In embodiments, the first message is sent by the digital asset exchange computer system via a secure channel.

In embodiments, the first message is encrypted communication.

In embodiments, the first message is encrypted using an asymmetric key.

In embodiments, the asymmetric key is a PKI key.

In embodiments, the first message is encrypted using a symmetric key.

In embodiments, the first message is encrypted in accordance with Transport Layer Security protocol.

In embodiments, the first message is encrypted by the first user device.

In embodiments, the first message is encrypted by the digital asset exchange computer system.

In embodiments, the first transaction request is published via a secure channel.

In embodiments, the second transaction request is published via a secure channel.

In embodiments, the third transaction request is published via a secure channel.

In embodiments, the second blockchain is based on a mathematical protocol for proof of work.

In embodiments, the second blockchain is based on a mathematical protocol for proof of stake.

In embodiments, the second blockchain is based on a cryptographic mathematical protocol.

In embodiments, the method further comprises a step of publishing, by the digital asset exchange computer system to a side ledger, transaction instructions associated with crediting the second amount of the second digital asset and the publishing step (d)(2) includes publishing the transaction instruction from the side ledger to the second distributed public asset ledger periodically or aperiodically.

In embodiments, the first electronic ledger is maintained and stored on the first plurality of geographically distributed computer systems in the first peer-to-peer network in the form of the first blockchain.

In embodiments, the first electronic ledger is maintained on a sidechain, separate from the first blockchain, wherein information on the sidechain is published and stored on the first blockchain periodically or aperiodically.

In embodiments, the second electronic ledger is maintained and stored on the second plurality of geographically distributed computer systems in the second peer-to-peer network in the form of the second blockchain.

In embodiments, the second electronic ledger is maintained on a sidechain, separate from the second blockchain, wherein information on the sidechain is published and stored on the second blockchain periodically or aperiodically.

In embodiments, the first electronic ledger and the second electronic ledger are maintained in separate databases.

In embodiments, the predetermined fixed ratio is one first digital asset for one second digital asset.

In embodiments, the predetermined fixed ratio is 100 first digital asset for one second digital asset.

In embodiments, a method may comprise the steps of: (a) authenticating, by a digital asset token issuer computer system associated with a digital asset token issuer, an access request by a first user device associated with a first user, to the digital asset token issuer computer system, wherein the digital asset token issuer computer system is operatively connected to one or more databases which include: i. a first electronic ledger associated with a first digital asset maintained on a first distributed public transaction ledger in the form of a first blockchain that is maintained by a first blockchain network including a first plurality of geographically distributed computer systems in a first peer-to-peer network; ii. a second electronic ledger associated with a second digital asset maintained on a second distributed public transaction ledger in the form of a second blockchain that is maintained by a second blockchain network including a second plurality of geographically distributed computer systems in a second peer-to-peer network, wherein a ratio of second digital asset to first digital asset is a predetermined fixed ratio, and wherein authenticating the access request received from the first user device comprises the steps of: (1) receiving, by the digital asset token issuer computer system from the first user device, an authentication request including first user credential information associated with the first user; (2) determining, by the digital asset token issuer computer system, that the first user device is authorized to access the digital asset token issuer computer system based at least in part on the first user credential information; (3) generating, by the digital asset token issuer computer system, first machine-executable instructions including first graphical user interface information associated with a first graphical user interface; (4) transmitting, from the digital asset token issuer computer system to the first user device, the first machine-executable instructions, wherein, upon execution of the first machine-executable instructions, the first user device displays the first graphical user interface; (b) receiving, by the digital asset computer system from the first user device, a first request to obtain a first amount of the first digital asset in exchange for a second amount of the second digital asset, comprising the steps of: (1) receiving, by the digital asset token issuer computer system from the first user device, the first request; (2) verifying, by the digital asset token issuer computer system, the first request by determining the first user has at least the second amount of the second digital asset based on reference to the second electronic ledger; (3) generating, by the digital asset token issuer computer system, a first transaction request including first instructions to generate a first designated public address on the second blockchain, wherein the digital asset token issuer computer system digitally signs the first transaction request with a first private key associated with the digital asset token issuer; (4) publishing, by the digital asset token issuer computer system, the first transaction request such that the second plurality of geographically distributed computer systems in the second peer-to-peer network verify the first transaction request and execute the first instructions by generating first designated address information including a first designated key pair associated with a first designated public address on the second blockchain; (5) obtaining, by the digital asset token issuer computer system based on reference to the second blockchain, first designated address information; (6) generating, by the digital asset token issuer computer system, a first message including instructions for the first user to transfer the second amount of the second digital asset to the first designated public address on the second blockchain; and (7) sending, by the digital asset token issuer computer system to the first user device, the first message; (c) confirming, by the digital asset token issuer computer system based on reference to the second blockchain, a first deposit of the second amount of the second digital asset by performing the steps of: (1) monitoring the first designated public address on the second blockchain; and (2) determining the second amount of the second digital asset was received at the first designated public address; (d) issuing, by the digital asset token issuer computer system, the first amount of the first digital asset by performing the steps of: (1) generating, by the digital asset token issuer computer system, a second transaction request including a second message comprising second instructions to: (i) transfer the second amount of the second digital asset from the first designated public address to a first smart contract address on the second blockchain; and (ii) burn the second amount of the second digital asset; wherein the first smart contract address is associated with first smart contract instructions saved as part of the second blockchain and including: (i) verification instructions indicating conditions under which transaction requests published on the second blockchain and addressed to the first smart contract address are verified; and (ii) burn instructions indicating conditions under which the second digital asset is burned, and wherein the digital asset token issuer computer system digitally signs the second transaction request with a second private key associated with the digital asset token issuer; (2) publishing, by the digital asset token issuer computer system to the first smart contract address on the second blockchain, the second transaction; (3) confirming, by the digital asset token issuer computer system, the second transaction request was executed based on reference to the second blockchain; (4) updating, by the digital asset token issuer computer system, the second electronic ledger to account for the second transaction request; (5) generating, by the digital asset token issuer computer system, a third transaction request including third instructions to: (i) transfer a third amount of the first digital asset from a reserve public address [RESERVE] on the first blockchain to a second designated public address on the first blockchain; and (ii) transfer a fourth amount [FEE] of the first digital asset from the reserve public address to an exchange public address associated with the digital asset token issuer, wherein the digital asset token issuer computer system digitally signs the third transaction request with a third private key associated with the digital asset token issuer; and (6) publishing, by the digital asset token issuer computer system to the first blockchain, the third transaction request; and (e) confirming, by the digital asset token issuer computer system based on reference to the first blockchain, that the third transaction request was executed by performing the steps of: (1) monitoring the second designated public address on the first blockchain; and (2) determining the third amount of the first digital asset was received at the second designated public address; and (3) updating, by the digital asset token issuer computer system, the first electronic ledger to account for the third transaction request.

In embodiments, the second blockchain is the Ethereum network.

In embodiments, the first blockchain is the Bitcoin network.

In embodiments, the first blockchain is the Bitcoin Cash network.

In embodiments, the first blockchain is the Stellar network.

In embodiments, the first blockchain is the Filecoin network.

In embodiments, the first blockchain is the Litecoin network.

In embodiments, the first blockchain is the Tezos network.

In embodiments, the first blockchain is the Zcash network.

In embodiments, the first blockchain is the Neo network.

In embodiments, the first blockchain is the Ether Classic network.

In embodiments, the second blockchain is the Neo network.

In embodiments, the second blockchain is the Ether Classic network.

In embodiments, the digital signature is first transaction request include a digital signature generated using at least two private keys associated with the digital asset token issuer.

In embodiments, the first transaction information comprises information sufficient to indicate a plurality of transactions, including, for each respective transaction: i. respective transaction identification information including a respective transaction identifier associated with the respective transfer of a respective amount of the first digital asset to a respective designated public address: ii. a first respective public address; and iii. a second respective public address.

In embodiments, the first transaction request includes a first plurality of instructions, each associated with generating a respective designated public address associated with depositing the first digital asset, wherein the second transaction request includes a second plurality of instructions, each associated with transferring a respective reserve amount of the first digital asset to the reserve public address and a respective fee amount of the first digital asset to the first exchange public address, and wherein the third transaction request includes a third plurality of instructions, each associated with transferring a respective amount of the second digital asset to a respective digital address on the second blockchain.

In embodiments, the first transaction request is digitally signed with at least two private keys associated with the digital asset token issuer.

In embodiments, the second transaction request is digitally signed with at least two private keys associated with the digital asset token issuer.

In embodiments, the third transaction request is digitally signed with at least two private keys associated with the digital asset token issuer.

In embodiments, the first transaction request is published via a secure channel.

In embodiments, the second transaction request is published via a secure channel.

In embodiments, the third transaction request is published via a secure channel.

In embodiments, the second designated public address is unique to the first user.

In embodiments, conditions under which transaction requests published on the second blockchain are verified in accordance with the verification instructions includes verifying a digital signature associated with published transaction requests such that the verified digital signature is associated with the digital asset token issuer.

In embodiments, the first transaction information associated with the second transaction request includes an identifier unique to the second transaction request.

In embodiments, the method may further comprise: (m) prior to determining the first amount of the first digital asset was received at the first designated public address, generating third-party monitoring information including the first designated public address; (n) sending, by the digital asset token issuer computer system to a third-party computer system associated with a third-party, the third-party monitoring information, wherein the third-party computer system monitors the first blockchain for one or more transactions associated with the first designated public address, wherein the third-party computer system determines the first amount of the first digital asset was received at the first designated public address, wherein the third-party computer system obtains the first transaction information, wherein the third-party computer system generates a notification indicating the obtained fist transaction information, and wherein the third-party computer system sends, to the digital asset token issuer computer system, the generated notification.

In embodiments, the notification is encrypted and sent via a secure channel.

In embodiments, the notification is encrypted by the third-party computer system.

In embodiments, the notification is encrypted communication.

In embodiments, the notification is encrypted using an asymmetric key.

In embodiments, the asymmetric key is a PKI key.

In embodiments, the notification is encrypted using a symmetric key.

In embodiments, the notification is encrypted in accordance with Transport Layer Security protocol.

In embodiments, the notification is encrypted by the digital asset token issuer computer system.

In embodiments, the authentication request is made by the first user device via a secure channel.

In embodiments, the authentication request is encrypted communication.

In embodiments, the authentication request is encrypted using an asymmetric key.

In embodiments, the asymmetric key is a PKI key.

In embodiments, the authentication request is encrypted using a symmetric key.

In embodiments, the authentication request is encrypted in accordance with Transport Layer Security protocol.

In embodiments, the authentication request is encrypted by the first user device.

In embodiments, the authentication request is encrypted by the digital asset token issuer computer system.

In embodiments, the first machine-executable instructions are transmitted by the digital asset token issuer computer system via a secure channel.

In embodiments, the first machine-executable instructions are encrypted communication.

In embodiments, the first machine-executable instructions are encrypted using an asymmetric key.

In embodiments, the asymmetric key is a PKI key.

In embodiments, the first machine-executable instructions are encrypted using a symmetric key.

In embodiments, the first machine-executable instructions are encrypted in accordance with Transport Layer Security protocol.

In embodiments, the first machine-executable instructions are encrypted by the first user device.

In embodiments, the first machine-executable instructions are encrypted by the digital asset token issuer computer system.

In embodiments, the first request is made by the first user device via a secure channel.

In embodiments, the first request is encrypted communication.

In embodiments, the first request is encrypted using an asymmetric key.

In embodiments, the asymmetric key is a PKI key.

In embodiments, the first request is encrypted using a symmetric key.

In embodiments, the first request is encrypted in accordance with Transport Layer Security protocol.

In embodiments, the first request is encrypted by the first user device.

In embodiments, the first request is encrypted by the digital asset token issuer computer system.

In embodiments, the first message is sent by the digital asset token issuer computer system via a secure channel.

In embodiments, the first message is encrypted communication.

In embodiments, the first message is encrypted using an asymmetric key.

In embodiments, the asymmetric key is a PKI key.

In embodiments, the first message is encrypted using a symmetric key.

In embodiments, the first message is encrypted in accordance with Transport Layer Security protocol.

In embodiments, the first message is encrypted by the first user device.

In embodiments, the first message is encrypted by the digital asset token issuer computer system.

In embodiments, the first transaction request is published via a secure channel.

In embodiments, the second transaction request is published via a secure channel.

In embodiments, the third transaction request is published via a secure channel.

In embodiments, the second blockchain is based on a mathematical protocol for proof of work.

In embodiments, the second blockchain is based on a mathematical protocol for proof of stake.

In embodiments, the second blockchain is based on a cryptographic mathematical protocol.

In embodiments, the method may further comprise a step of publishing, by the digital asset token issuer computer system to a side ledger, transaction instructions associated with crediting the second amount of the second digital asset and the publishing step (d)(2) includes publishing the transaction instruction from the side ledger to the second distributed public asset ledger periodically or aperiodically.

In embodiments, the first electronic ledger is maintained and stored on the first plurality of geographically distributed computer systems in the first peer-to-peer network in the form of the first blockchain.

In embodiments, the first electronic ledger is maintained on a sidechain, separate from the first blockchain, wherein information on the sidechain is published and stored on the first blockchain periodically or aperiodically.

In embodiments, the second electronic ledger is maintained and stored on the second plurality of geographically distributed computer systems in the second peer-to-peer network in the form of the second blockchain.

In embodiments, the second electronic ledger is maintained on a sidechain, separate from the second blockchain, wherein information on the sidechain is published and stored on the second blockchain periodically or aperiodically.

In embodiments, the first electronic ledger and the second electronic ledger are maintained in separate databases.

In embodiments, the predetermined fixed ratio is one first digital asset for one second digital asset.

In embodiments, the predetermined fixed ratio is 100 first digital asset for one second digital asset.

In embodiments, one or more users associated with wrapping and/or burning digital assets may be off-boarded by an administrator (e.g., digital asset exchange computer system 6102, administrator system 6801, and/or administrator system 1801, to name a few) in accordance with various embodiments of the present invention. For example, a first user may be inactive for a predetermined period of time and the administrator may off-board the first user for inactivity. As another example, a first user may be the subject of a SARs (Stock Appreciation Rights) violation triggering the off-boarding of said first user and the administrator may off-board the first user. As another example, a first user may violate terms and conditions associated with being a first user associated with the administrator. Continuing the example, the violation, in embodiments, may trigger an off-boarding process of the first user.

An exemplary process for off-boarding one or more users is illustrated in connection with FIG. 120. Referring to FIG. 120, a process for off-boarding one or more users may, in embodiments, optionally begin with step S12002. At step S12002, in embodiments, a digital asset exchange (and/or administrator) may receive a first message from a first user device associated with a first user. The message, in embodiments, may include a first request to off-board the first user as a first user associated with the digital asset exchange computer system. In embodiments, the message may include one or more of the following: (1) an identifier associated with a first user (e.g., the first user associated with the first user device requesting to be off-boarded); (2) one or more designated public addresses associated with the first user; (3) one or more public keys associated with the first user; (4) one or more digital signatures associated with private keys associated with the first user; (5) a request to be off-boarded; and/or (6) a combination thereof, to name a few. In embodiments, the message may be digitally signed by a private key associated with the first user and/or digital asset exchange (e.g., for MPC key sets). For example, the message sent by the third-party computer system may include all or a portion of a private key associated with the third-party computer system. The message, continuing the example, may be verified by confirming the private key is associated with the first user device (and/or a public address associated with the first user device and/or public key associated with the first user device). In embodiments, messages and/or transactions sent to and/or from the administrator and/or first user device may be encrypted. Encryption, for example, may enhance the security of sent and/or published messages and/or transactions. For example, a message and/or transaction, when sent by a first user to the digital asset exchange computer system, may be encrypted using Rivest, Shamir, & Aldeman (RSA) algorithm(s). As another example, a message and/or transaction, when published to the blockchain, may be encrypted using Twofish algorithm(s). In embodiments, messages and/or transactions sent between one or more parties and/or published to the blockchain may be encrypted in accordance with one or more of encryption algorithm(s), such as: Triple Data Encryption Standard (DES), RSA, Blowfish, Twofish, Advanced Encryption Standard (AES), and/or a combination thereof, to name a few. Further, messages and/or transactions sent between one or more parties and/or published to the blockchain may be encrypted, which may include one or more of the following techniques: character substitution, scrambling, mapping, hashing, and/or a combination thereof, to name a few. In embodiments, symmetric and or asymmetric encryption algorithms may be applied.

For example, one or more transactions and/or messages may be encrypted and/or decrypted by using and/or applying a cryptographic hash function of one or more of: the one or more messages, the one or more transactions, the public key(s) associated with the one or more messages and/or transactions, the private key(s) associated with the one or more messages and/or transactions, and/or a combination thereof, to name a few. A cryptographic hash function may be a hash function that is a mathematical algorithm which maps data of arbitrary size to a bit string of a fixed size (e.g., a hash). In embodiments, the cryptographic hash function may be designed to be a one-way function (e.g., a function that is infeasible to invert). The cryptographic hash function, may include one or more of the following prosperities: (1)

deterministic such that the same message produces results in the same hash; (2) high speed, such that the hash value for a message is computed in a manner that does not slow the process down; (3) infeasible to generate a message from the hash, such that generating a message from the hash value would require attempting all possibilities (e.g., a brute force approach); and (4) unique, such that messages to not have the same hash value and/or small changes to a message alter the hash value such that the values do not correlate, to name a few.

In embodiments, the administrator may off-board one or more users without receiving a message requesting to off-board. The administrator, in embodiments, may off-board one or more users for one or more of the following reasons: (1) receiving a request from the first user; (2) inactivity (e.g., for burning or issuing) on behalf of the first user for a predetermined amount of time (e.g., an amount of days, weeks, months, years, etc.); (3) one or more bad acts on behalf of the first user (e.g., fraud, insider trading, money laundering, and/or a combination thereof, to name a few); and/or (4) a combination thereof, to name a few.

In embodiments, the process for off-boarding one or more users may continue with step S12004. At step S12004, in embodiments, the digital asset exchange computer may verify the first request. In embodiments, verification of the received request may include, for example, one or more exchange format requirements associated with requests for off-boarding a first user. In embodiments, verification of the received request, may include, for example, verifying information associated with the first user (e.g., received with the request). The administrator, in embodiments, may verify the request by verifying one or more of the following: (1) an identifier associated with a first user (e.g., the first user associated with the first user device requesting to be off-boarded); (2) one or more designated public addresses associated with the first user; (3) one or more public keys associated with the first user; (4) one or more digital signatures associated with private keys associated with the first user; (5) a request to be off-boarded; and/or (6) a combination thereof, to name a few. In embodiments, a request to off-board may not be verified. The digital asset exchange, in embodiments, may generate and send a failed verification notification to the first user device associated with the request to off-board as a first user.

The verified request, in embodiments, may be stored by the digital asset exchange computer system (e.g., in memory 6102-C). In embodiments, the request may be stored as part of the first blockchain (e.g., second blockchain 11711726) and/or as part of the second blockchain (e.g., the first blockchain 11711712). The transaction request, in embodiments, may be digitally signed by the administrator system (e.g., using a private key associated with the administrator system) and/or digitally signed by the administrator system and the first user device (e.g., via MPC). For example, the digital asset exchange computer system may generate a transaction request including instructions to store the request to off-board and associated information (e.g., the first smart contract 11714A, the second smart contract 11716A, and/or the third smart contract 11718A, to name a few). Continuing the example, the digital asset exchange computer system may publish the transaction request on the blockchain (e.g., the first blockchain 11712 and/or the second blockchain 11726, to name a few), resulting in the execution of the transaction request. The digital asset exchange computer system may confirm the storage of the off-boarding request (e.g., by sending a call—digitally signed by the digital asset exchange computer system and/or encrypted—to the public address and receiving a return—digitally signed and/or encrypted—of information indicating the execution of the transaction request).

In embodiments where the administrator is off-boarding one or more users without a received request from the one or more users, the administrator may determine that the one or more users will be off-boarded based on one or more rules. For example, the digital asset exchange computer system 6102 may require users to make at least one request a month to burn a digital asset token. As another example, the digital asset exchange computer system 6102 may require users to make at least one request a week to issue a digital asset token. As another example, the digital asset exchange computer system 6102 may receive one or more SARs messages indicating one or more bad acts perpetrated by the first user—triggering the off-boarding process.

In embodiments, the process for off-boarding one or more users may continue with step S12006. At step S12006, in embodiments, the digital asset exchange computer system may generate a first transaction request. The first transaction request, in embodiments, may be digitally signed by the administrator system (e.g., using a private key associated with the administrator system) and/or digitally signed by the administrator system and the first user device (e.g., via MPC). The first transaction request, in embodiments, may include instructions to: (1) burn one or more designated public address(es); (2) burn one or more designated key sets associated with the one or more designated public address(es); (3) verify the request to off-board; (4) off-board the first user as a first user based at least on the request to off-board; and/or (5) a combination thereof, to name a few. In embodiments, the generated first transaction request may be encrypted and/or digitally signed (e.g., by the first user device and/or digital asset computer system) in a similar manner as described above in connection with step S12002, the description of which applying herein. In embodiments, the first transaction request may include one or more transaction requests. For example, the first transaction request may include a second transaction request and a third transaction request each of which may be digitally signed (e.g., signed by the administrator system (e.g., using a private key associated with the administrator system) and/or digitally signed by the administrator system and the first user device (e.g., via MPC)) and/or encrypted. The second transaction request, continuing the example, may include instructions for one or more smart contracts on the first blockchain 11712 to (1) burn one or more designated public address(es) on the first blockchain 11712; (2) burn one or more designated key sets associated with the one or more designated public address(es) on the first blockchain 11712; (3) verify the first user account information; (4) off-board the first user; and/or (5) a combination thereof, to name a few. The third transaction request, continuing the example, may include instructions for one or more smart on the second blockchain 11712 to (1) burn one or more designated public address(es) on the second blockchain 11726; (2) burn one or more designated key sets associated with the one or more designated public address(es) on the second blockchain 11726; (3) verify the first request; (4) off-board the first user based at least on the first request; and/or (5) a combination thereof, to name a few.

In embodiments, the process for off-boarding one or more users may continue at step S12008. At step S12008, in embodiments, the digital asset exchange computer system may publish the first transaction request on the second blockchain. The published transaction, in embodiments, may trigger one or more smart to burn one or more designated public address(es) and/or one or more corresponding designated key sets. In embodiments, the published transaction may trigger one or more smart to verify and/or store the request to offboard. The stored request, in embodiments, may be accessible by one or more smart to verify transaction requests. In embodiments, the published transaction may trigger one or more smart to remove the first user as a first user associated with the administrator. In embodiments where the first transaction request includes transaction requests for multiple blockchains, each transaction request may be published to each respective blockchain—each of the transaction requests may be digitally signed (e.g., signed by the administrator system (e.g., using a private key associated with the administrator system) and/or digitally signed by the administrator system and the first user device (e.g., via MPC)) and/or encrypted. For example, a first transaction request may be published on a first blockchain and a second transaction request may be published on a second blockchain. The first transaction request, continuing the example, may include a request to burn one or more designated public address(es) on the first blockchain and/or one or more corresponding designated key sets. The second transaction request, continuing the example may include a request to burn one or more designated public address(es) on the second blockchain and/or one or more corresponding designated key sets. The one or more smart contracts as used in connection with FIG. 120, in embodiments, may be similar to one or more of the first smart contract 11714A, second smart contract 11716A, and/or third smart contract 11718A, described in connection with FIGS. 117A, 117B-1, 117B-2, 117B-3, 117C-1, 117C-2, 117C-3, 119A, 119A-1, 119A-2, 119B, 119B-1, and 119B-2, the descriptions of which applying herein.

The process for off-boarding one or more users may continue, in embodiments, with step S12010. At step S12010, in embodiments, the digital asset exchange system may confirm the execution of the first transaction request. The execution of the first transaction request, in embodiments, may be confirmed by the digital asset exchange computer system generating and publishing a call to one or more of the following: a smart contract, a public address, and/or a combination thereof. For example, the digital asset exchange computer system may confirm that the off-boarded entity (e.g., one or more public addresses, keys, identification numbers, to name a few) was burned from a list of users on the blockchain.

The process for on-boarding one or more users may continue with step S12012. In embodiments, at step S12012, the digital asset exchange computer system may generate a first message including confirmation of the execution of the first request to off-board. The confirmation message, in embodiments, may include confirmation of the execution of the first transaction request. In embodiments, the generated first message may be encrypted and/or digitally signed (e.g., by the first user device and/or digital asset computer system) in a similar manner as described above in connection with step S12002, the description of which applying herein. The generated message, in embodiments at step S12014, may be sent by the digital asset exchange computer system to the first user device associated with the off-boarded first user.

In embodiments, the communications (including messages, transaction requests, instructions, calls, and/or returns, to name a few) may be encrypted and/or digitally signed by the sender of the communication and/or the recipient of the communication. The steps of the process described in connection with FIG. 120 may be rearraigned or omitted.

Multi-Leg Transactions

Figure 53A:
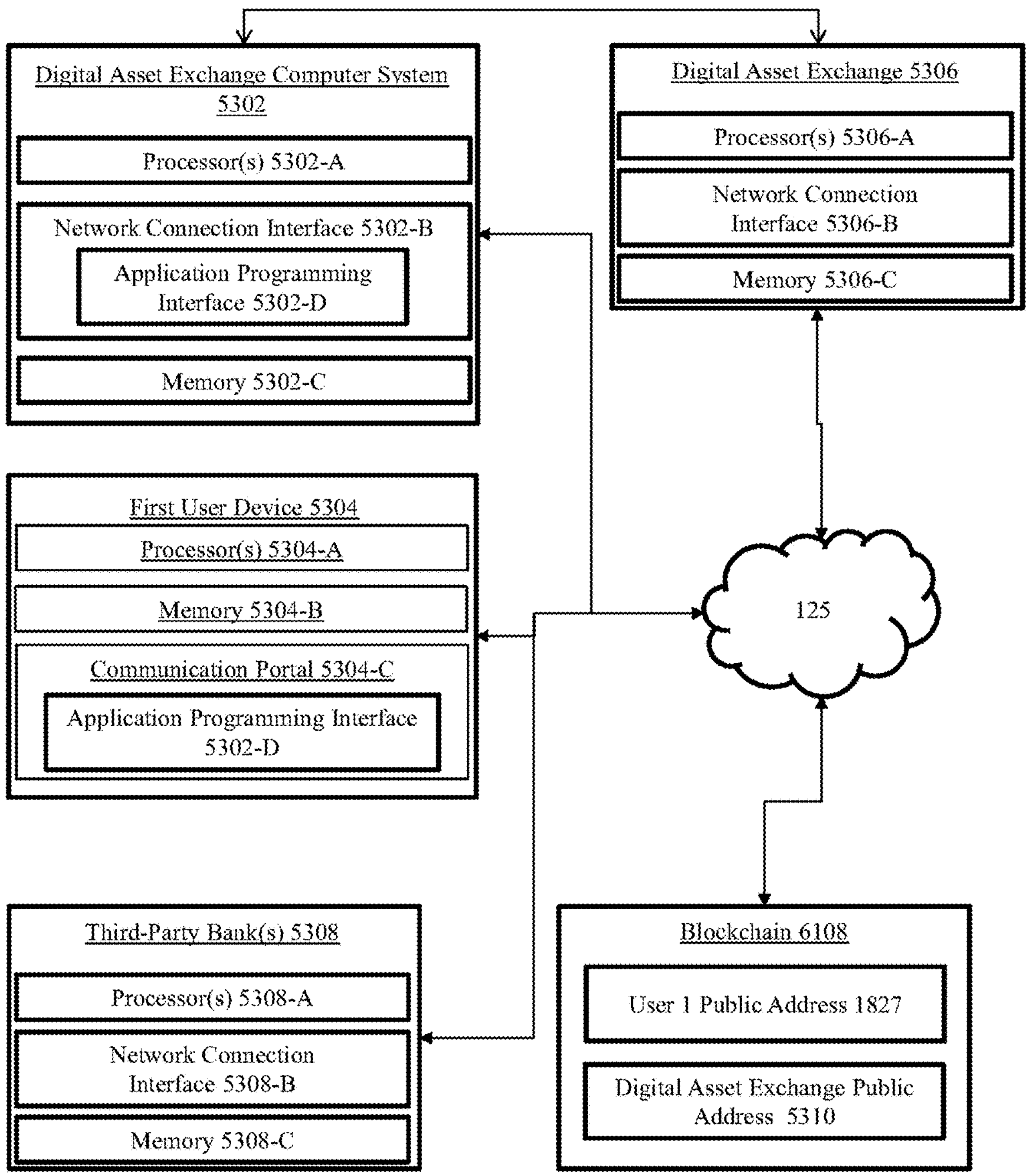
FIG. 53A is a schematic drawing of a digital asset exchange computer system communicating with a digital asset exchange, first user device, and one or more third party banks in accordance with exemplary embodiments of the present invention.
Figure 53B:
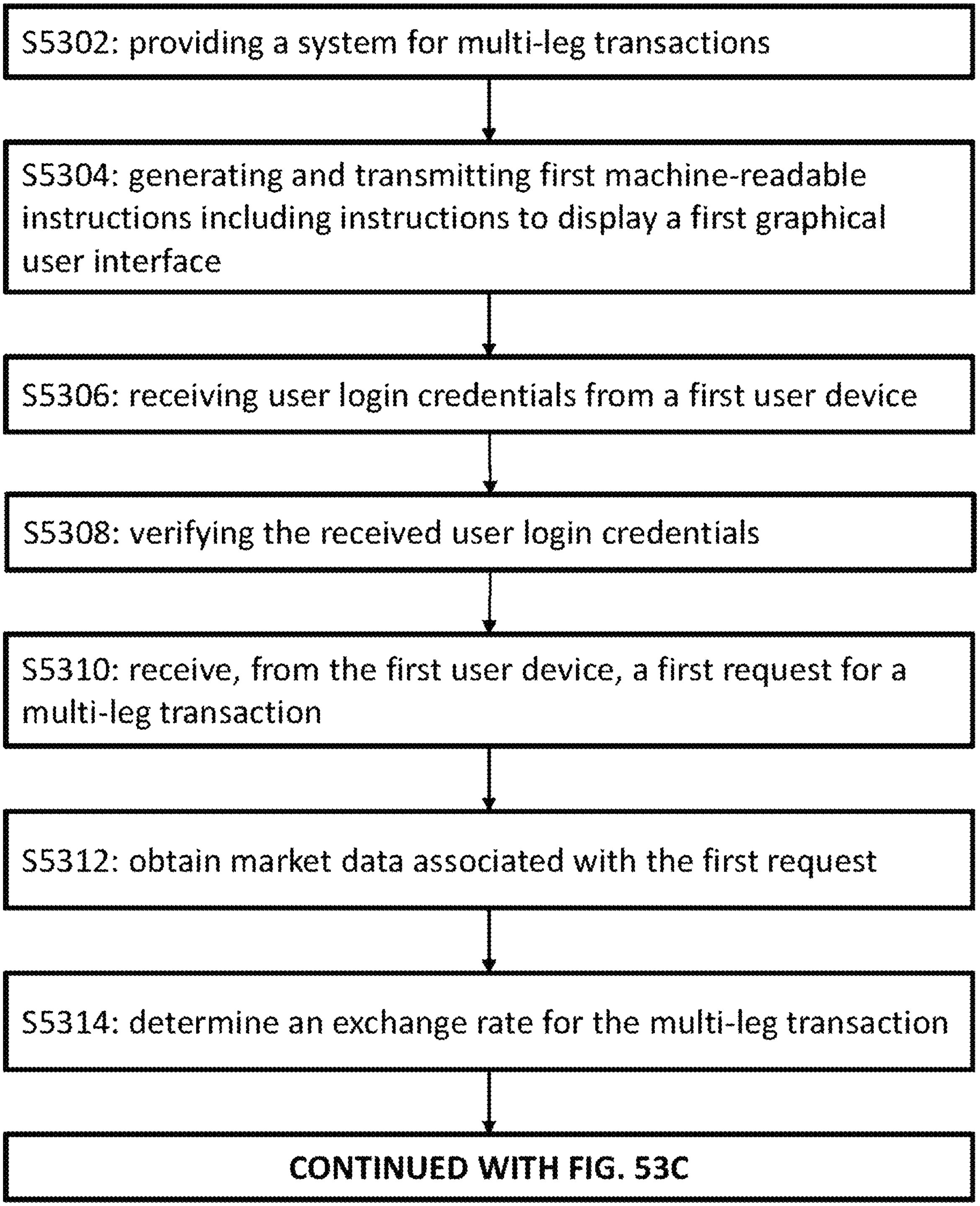
FIGS. 53B-53C are exemplary flow charts of a process for providing and executing a multi-leg transaction in accordance with exemplary embodiments of the present invention.

FIG. 53B is a flowchart illustrating an exemplary process for executing multi-leg transactions in accordance with embodiments of the present invention. Referring to FIG. 53B, in embodiments, the process for executing multi-leg transactions may begin with step S5302. In embodiments, at step S5302, a system for multi-leg transactions interacting with third-party banks and/or a user device is provided. An exemplary system for executing multi-leg transactions interacting a first user device 5304 associated with a first user and with one or more third-party bank(s) 5308 (hereinafter "third party bank(s) 5308") is illustrated in connection with FIG. 53A. Referring to FIG. 53A, in embodiments, the system may include one or more of the following: a digital asset exchange 5306; and/or a digital asset exchange computer system 5302 associated with the digital asset exchange 5306, to name a few. The components of the system illustrated in FIG. 53A, in embodiments, may communicate via network 125. In embodiments, network 125 may refer to one or more of the following: the Internet, a wide area network, a local area network, a telephone network, dedicated access lines, a proprietary network, a satellite network, a wireless network, a mesh network, or through some other form of end-user to end-user interconnection, which may transmit data and/or other information. Any participants in a digital asset network may be connected directly or indirectly, through wired, wireless, or other connections (e.g., via network 125).

In embodiments, the digital asset exchange computer system 5302 may store one or more exchange key sets associated with the exchange computer system. Each of the one or more exchange key sets, in embodiments, may include an exchange public key and an exchange private key. In embodiments, each exchange private key may be mathematically related to a respective exchange public key. Each exchange public key, in embodiments, may be associated with an exchange public address associated with the blockchain 6108. In embodiments, the digital asset exchange public address 53101 may be an address on the blockchain 6108 that is associated with the digital asset exchange computer system 5302, which is associated with the digital asset exchange 5306. As used herein, the one or more exchange key sets, respective exchange public keys and corresponding exchange private keys, and the associated exchange public address may be similar to the key sets, public keys, private keys, and public addresses described above, the descriptions of which applying herein.

In embodiments, first user device 5304, as used herein, may refer to one or more suitable electronic devices including, but not limited to, desktop computers, mobile computers (e.g., laptops, ultrabooks), servers, mobile phones, portable computing devices, such as smart phones, tablets and phablets, televisions, set top boxes, smart televisions, personal display devices, personal digital assistants ("PDAs"), gaming consoles and/or devices, virtual reality devices, smart furniture, smart household devices (e.g., refrigerators, microwaves, etc.), smart vehicles (e.g., cars, trucks, motorcycles, etc.), smart transportation devices (e.g., boats, ships, trains, airplanes, etc.), and/or wearable devices (e.g., watches, pins/broaches, headphones, etc.), to name a few. In some embodiments, first user device 5304 may be relatively simple or basic in structure such that no, or a minimal number of, mechanical input option(s) (e.g., keyboard, mouse, track pad) or touch input(s) (e.g., touch screen, buttons) are included. For example, the first user device 5304 may be able to receive and output audio, and may include power, processing capabilities, storage/memory capabilities, and communication capabilities. In embodiments, the first user device 5304 may include one or more components for receiving mechanical inputs or touch inputs, such as a touch screen and/or one or more buttons.

First user device 5304 may, in embodiments, be a voice activated electronic device. A voice activated electronic device, as described herein, may include any device capable of being activated in response to detection of a specific word (e.g., a word, a phoneme, a phrase or grouping of words, or any other type of sound, or any series of temporally related sounds). For example, a voice activated electronic device may be one or more of the following: Amazon Echo®; Amazon Echo Show®; Amazon Echo Dot®; Smart Television (e.g., Samsung® Smart TVs); Google Home®; Voice Controlled Thermostats (e.g., Nest®; Honeywell® Wi-Fi Smart Thermostat with Voice Control), smart vehicles, smart transportation devices, wearable devices (e.g., Fitbit®), and/or smart accessories, to name a few.

In embodiments, first user device 5304 may include one or more processor(s) 5304-A, memory 5304-B, and communication portal 5304-C. One or more processor(s) 5304-A, may include any suitable processing circuitry capable of controlling operations and functionality of first user device 5304, as well as facilitating communications between various components within first user device 5304. In some embodiments, processor(s) 5304-A may include a central processing unit ("CPU"), a graphic processing unit ("GPU"), one or more microprocessors, a digital signal processor, or any other type of processor, or any combination thereof. In some embodiments, the functionality of processor(s) 5304-A may be performed by one or more hardware logic components including, but not limited to, field-programmable gate arrays ("FPGA"), application specific integrated circuits ("ASICs"), application-specific standard products ("ASSPs"), system-on-chip systems ("SOCs"), and/or complex programmable logic devices ("CPLDs"). Furthermore, each of processor(s) 5304-A may include its own local memory, which may store program systems, program data, and/or one or more operating systems. However, processor(s) 5304-A may run an operating system ("OS") for first user device 5304, and/or one or more firmware applications, media applications, and/or applications resident thereon. In some embodiments, processor(s) 5304-A may run a local client script for reading and rendering content received from one or more websites. For example, processor(s) 5304-A may run a local JavaScript client for rendering HTML or XHTML content received from a particular URL accessed by first user device 5304.

In embodiments, as mentioned above, first user device 5304 may also include memory 5304-B. Memory 5304-B may include one or more types of storage mediums such as any volatile or non-volatile memory, or any removable or non-removable memory implemented in any suitable manner to store data for first user device 5304. For example, information may be stored using computer-readable instructions, data structures, and/or program systems. Various types of storage/memory may include, but are not limited to, hard drives, solid state drives, flash memory, permanent memory (e.g., ROM), electronically erasable programmable read-only memory ("EEPROM"), CD ROM, digital versatile disk ("DVD") or other optical storage medium, magnetic cassettes, magnetic tape, magnetic disk storage or other magnetic storage devices, RAID storage systems, or any other storage type, or any combination thereof. Furthermore, memory 5304-B may be implemented as computer-readable storage media ("CRSM"), which may be any available physical media accessible by processor(s) 5304-A to execute one or more instructions stored within memory 5304-B. In some embodiments, one or more applications (e.g., mobile application software, gaming, music, video, calendars, lists, banking, social media etc.) may be run by processor(s) 5304-A, and may be stored in memory 5304-B.

In embodiments, as mentioned above, first user device 5304 may also include communications portal 5304-C. Communications portal 5304-C may include any circuitry allowing or enabling one or more components of the first user device 5304 to communicate with one another, with the digital asset exchange computer system 5302 (e.g., via the API 5302-D), and/or with one or more additional devices, servers, and/or systems. As an illustrative example, data retrieved from memory 5304-B may be transmitted via the API 5302-D, to the digital asset exchange computer system 5302 using any number of communications protocols. For example, the API 5302-D may be accessed using Transfer Control Protocol and Internet Protocol ("TCP/IP") (e.g., any of the protocols used in each of the TCP/IP layers), Hypertext Transfer Protocol ("HTTP"), WebRTC, SIP, and wireless application protocol ("WAP"), are some of the various types of protocols that may be used to facilitate communications between first user device 5304 and the digital asset exchange computer system 5302. In some embodiments, first user device 5304 and digital asset exchange computer system 5302 may communicate with one another via a web browser using HTTP. Various additional communication protocols may be used to facilitate communications between first user device 5304 and/or digital asset exchange computer system 5302, include the following non-exhaustive list, Wi-Fi (e.g., 802.11 protocol), Bluetooth, radio frequency systems (e.g., 900 MHz, 1.4 GHz, and 5.6 GHz communication systems), cellular networks (e.g., GSM, AMPS, GPRS, CDMA, EV-DO, EDGE, 3GSM, DECT, IS 136/TDMA, iDen, LTE or any other suitable cellular network protocol), infrared, BitTorrent, FTP, RTP, RTSP, SSH, and/or VOIP.

Communications portal 5304-C may use any communications protocol, such as any of the previously mentioned exemplary communications protocols. In some embodiments, first user device 5304 may include one or more antennas to facilitate wireless communications with a network using various wireless technologies (e.g., Wi-Fi, Bluetooth, radiofrequency, etc.). In yet another embodiment, first user device 5304 may include one or more universal serial bus ("USB") ports, one or more Ethernet or broadband ports, and/or any other type of hardwire access port so that communications portal 5304-C allows first user device 5304 to communicate with one or more communications networks.

In embodiments, the first user device 5304 may include one or more display screens or other type of display device. The one or more display screens may correspond to a display device and/or touch screen, which may be any size and/or shape and may be located at any portion of the first user device 5304. Moreover, the display screen, in embodiments, may be operationally connected to the first user device 5304 (e.g., connected via one or more cables and/or wires, wireless connection, etc., to name a few). Various types of display devices may include, but are not limited to, liquid crystal displays ("LCD"), LED, OLED, QLED, monochrome displays, color graphics adapter ("CGA") displays, enhanced graphics adapter ("EGA") displays, video graphics array ("VGA") display, or any other type of display, or any variation or combination thereof. Still further, a touch screen may, in some embodiments, correspond to a display device including capacitive sensing panels capable of recognizing touch inputs thereon. For instance, the display screen may correspond to a projected capacitive touch ("PCT"), screen include one or more row traces and/or driving line traces, as well as one or more column traces and/or sensing lines. In some embodiments, the display screen may be an optional component for the first user device 5304. For instance, the first user device 5304 may not include the display screen. Such devices, sometimes referred to as "headless" devices, may output audio, or may be in communication with a display device for outputting viewable content.

In embodiments, the display screen, may include an insulator portion, such as glass, coated with a transparent conductor, such as indium tin oxide ("InSnO" or "ITO"). In general, one side of the touch screen display may be coated with a conductive material. A voltage may be applied to the conductive material portion generating a uniform electric field. When a conductive object, such as a human finger, stylus, or any other conductive medium, contacts the non-conductive side, typically an outer surface of the display screen, a capacitance between the object and the conductive material may be formed. The one or more processor(s) 5304-A may be capable of determining a location of the touch screen associated with where the capacitance change is detected and may register a touch input as occurring at that location.

In some embodiments, the display screen may include multiple layers, such as a top coating layer, a driving line layer, a sensing layer, and a glass substrate layer. The glass substrate layer may correspond to an insulator portion, while the top coating layer may be coated with one or more conductive materials. The driving line layer may include a number of driving lines, and the sensing layer may include a number of sensing lines, which are described in greater detail below. One or more additional layers, or spaces between layers, may be included. Furthermore, any suitable number of driving lines and sensing lines for driving the line layer and the sensing layer, respectively, may be used.

In some embodiments, the driving lines and the sensing lines of the driving line layer and the sensing line layer, respectively, may form a number of intersection points, where each intersection functions as its own capacitor. Each sensing line may be coupled to a source, such that a charge is provided to each sensing line, and changes in capacitance of a particular driving line and sensing line are detectable thereby. In response to a conductive object being brought proximate, or substantially touching an outer surface of the top coating layer, a mutual capacitance of a particular capacitor (e.g., an intersection point) may reduce in magnitude. In other words, a voltage drop may be detected at a location on the display screen of the first user device 5304 corresponding to where a conductive object contacted the display screen.

A change in capacitance may be measured to determine a location on the touch screen where the object has contacted the surface. For example, if an individual touches a point on the display screen of the first user device 5304, then a corresponding driving line and sensing line that intersect at that point may be identified. A location of the point may have one or more pixels associated with that location, and therefore one or more actions may be registered for an item or items that are displayed at that location. The one or more processor(s) 5304-A of the first user device 5304 may be configured to determine which pixels are associated with a particular location point, and which item or items are also displayed at that pixel location. Furthermore, the first user device 5304 may be configured to cause one or more additional actions to occur to the item or items being displayed on the display screen of the first user device 5304 based on a temporal duration the touch input, and or if one or more additional touch inputs are detected. For example, an object (e.g., a user's hand, a stylus, etc., to name a few) that is contacted on the display screen at a first location may be determined, at a later point in time, to contact the display screen at a second location. In the illustrative example, the object may have initially contacted the display screen at the first location and moved along a particular driving line to the second location. In this scenario, a same driving line may have detected a change in capacitance between the two locations, corresponding to two separate sensing lines.

The number of driving lines and sensing lines, and therefore the number of intersection points, may directly correlate to a "resolution" of a touch screen. For instance, the greater the number of intersection points (e.g., a greater number of driving lines and sensing lines), the greater precision of the touch input. For instance, a touch screen having 100 driving lines and 100 sensing lines may have 100 intersection points, and therefore 100 individual capacitors, while a touch screen having 10 driving lines and 10 sensing lines may only have 10 intersection points, and therefore 10 individual capacitors. Therefore, a resolution of the touch screen having 100 intersection points may be greater than a resolution of the touch screen having 10 intersection points. In other words, the touch screen having 100 intersection points may be able to resolve a location of an object touching the touch screen with greater precision than the touch screen having 10 intersection points. However, because the driving lines and sensing lines require a voltage to be applied to them, this may also mean that there is a larger amount of power drawn by the first user device 5304, and therefore the fewer driving lines and/or sensing lines used, the smaller the amount of power that is needed to operate the touch display screen.

In some embodiments, the display screen of the first user device 5304 may correspond to a high-definition ("HD") display. For example, the display screen may display images and/or videos of 720p, 1080p, 1080i, or any other image resolution. In these exemplary scenarios, the display screen may include a pixel array configured to display images of one or more resolutions. For instance, a 720p display may present a 1024 by 768, 1280 by 720, or 1366 by 768 image having 786,432; 921,600; or 1,049,088 pixels, respectively. Furthermore, a 1080p or 1080i display may present a 1920 pixel by 1080 pixel image having 2,073,600 pixels. However, the aforementioned display ratios and pixel numbers are merely exemplary, and any suitable display resolution or pixel number may be employed for the display screen, such as non-HD displays, 4K displays, and/or ultra displays.

The digital asset exchange computer system 5302, in embodiments, may include one or more processor(s) 5302-A, network connection interface 5302-B, and memory 5302-C. One or more processor(s) 5302-A, as used herein, may be similar to the one or more processor(s) 5304-A described above, the description of which applying herein. The network connection interface 5302-B may be similar to the communication portal 5304-C described above, the description of which applying herein. Memory 5302-C may be similar to memory 5304-B described above, the description of which applying herein. The digital asset exchange computer system 5302 may, in embodiments, be a plurality of computers and/or computer systems. In embodiments, the exchange computer system 5302 may further include one or more display screens, which may be similar to the display screen described above, the description of which applying herein.

The digital asset exchange 5306, in embodiments, may include one or more processor(s) 5306-A, network connection interface 5306-B, and memory 5306-C. One or more processor(s) 5306-A, as used herein, may be similar to the one or more processor(s) 5304-A described above, the description of which applying herein. The network connection interface 5306-B may be similar to the communication portal 5304-C described above, the description of which applying herein. Memory 5306-C may be similar to memory 5304-B described above, the description of which applying herein. The digital asset exchange 5306 may, in embodiments, be a plurality of computers and/or computer systems.

The third party bank(s) 5308, in embodiments, may include one or more processor(s) 5308-A, network connection interface 5308-B, and memory 5308-C. One or more processor(s) 5308-A, as used herein, may be similar to the one or more processor(s) 5304-A described above, the description of which applying herein. The network connection interface 5308-B may be similar to the communication portal 5304-C described above, the description of which applying herein. Memory 5308-C may be similar to memory 5304-B described above, the description of which applying herein. The digital asset exchange 5308 may, in embodiments, be a plurality of computers and/or computer systems.

Referring back to FIG. 53B, the process for executing a multi-leg transaction may, in embodiments, continue at step S5304. At step S5304, in embodiments, the digital asset exchange 5306 via the digital asset exchange computer system 5302 may generate first machine-readable instructions. The first-machine readable instructions may, in embodiments, include one or more instructions to display a first graphical user interface (GUI) upon receipt of the first machine readable instructions. In embodiments, the first machine-readable instructions may be generated in response to an access request from a customer. The access request, in embodiments, may indicate a user has accessed a webpage associated with the digital asset exchange 5306. In embodiments, the access request may be a request to connect the first user device 5304 and the digital asset exchange computer system 5302 via the application programming interface 5302-D. The first GUI, in embodiments, may be a login page, requesting user credentials. In embodiments the first machine-readable instructions may have been generated and stored in memory 5302-C and/or memory 5306-C prior to a customer request. Once generated (and/or obtained from memory 5302-C and/or memory 5306-C), in embodiments, the first machine-readable instructions may be transmitted by the digital asset exchange computer system 5302 to the first user device 5304 via network 125. In embodiments, the first machine-readable instructions may be executed by the processor(s) 5304-A of the first user device 5304 (e.g., upon receipt of the first machine-readable instructions). Execution of the first machine-readable instructions, in embodiments, may result in the first user device 5304 displaying the first GUI.

In embodiments, the first GUI may prompt the first user to enter login credentials. Login credentials, in embodiments, may include one or more of the following: a username and password combination; biometric data (e.g., a finger print, facial recognition, etc.), an electronic mail address, a telephone number, a social security number, a partial social security number, a government issued identification number, a shape, access card scan (e.g., swipe of a card associated with the exchange and having a magnetic strip), a pin (e.g., a number provided via SMS, other text message service, or email for multi-factor authentication), and/or a code, to name a few. The first user, in embodiments, may enter their login credentials, and, via the first user device 5304, transmit the entered login credentials to the digital asset exchange computer system 5302 over network 125. In embodiments, at step S5306, the digital asset exchange computer system 5302 may receive the login credentials from the first user device 5304.

The process, in embodiments, may continue at step S5308. At step S5308, in embodiments, the digital asset exchange computer system 5302 may verify the received user login credentials. In embodiments, verifying the user login credentials may include comparing the received login credentials with verified login credentials (e.g., credentials created by the first user and stored in memory 5302-C and/or memory 5306-C). If the login credentials are not verified, in embodiments, the digital asset exchange computer system 5302 may generate and send a notification indicating the received user login credentials are not verified. In embodiments, the login credentials may be verified. In embodiments, the verification of the login credentials may be required to continue the process described in connection with FIGS. 53B-53E. In embodiments, receiving verified user login credentials may not be required to continue the process described in connection with FIGS. 53B-53E.

In embodiments, in response to verifying the received user login credentials, the digital asset exchange computer system 5302 may generate second machine-readable instructions. The second machine-readable instructions may, in embodiments, include one or more instructions to display a second GUI upon receipt of the second machine readable instructions. The second GUI, in embodiments, may include a prompt requesting information regarding a multi-leg transaction. For example, the second GUI may prompt the first user to enter the type of transaction (e.g., exchanging an amount of fiat for an amount of digital asset, exchanging an amount of digital asset for an amount of fiat, to name a few), the type of fiat (e.g., USD, Euro, Afghan afghani, Russian Rubie, Armenian Dram, Peso, Canadian Dollar, Georgian Lari, Iraqi Dinar, Moldovan Leu, Rwandan Franc, Seychellois Rupee, Turkmenistan Manat, British Pound, and/or Zambian Kwacha, to name a few), the type of digital asset (e.g., BITCOIN, NAMECOINS, LITECOINS, PPCOINS, TONAL BITCOINS, BITCOIN CASH, ZCASH, IXCOINS, DEVCOINS, FREICOINS, I0COINS, TERRACOINS, LIQUIDCOINS, BBQCOINS, BITBARS, PHENIXCOINS, RIPPLE, DOGECOINS, BARNBRIDGE, POLYGON, SOMNIUM SPACE, OCEAN PROTOCOL, SUSHISWAP, INJECTIVE, LIVEPEER, MASTERCOINS, BLACKCOINS, ETHER, NXT, BITSHARES-PTS, QUARK, PRIMECOIN, FEATHERCOIN, PEERCOIN, FACEBOOK GLOBAL COIN, STELLAR, TOP 100 TOKENS, TETHER, MAKER, CRYPTO.COM CHAIN; BASIC ATTENTION TOKEN; USD COIN; CHAINLINK; BITTORRENT; OMISEGO; HOLO; TRUEUSD; PUNDI X; ZILLIQA; ATOM, AUGUR; 0X; AURORA; PAXOS STANDARD TOKEN; HUOBI TOKEN, IOST; DENT; QUBITICA; ENJIN COIN; MAXIMINE COIN, THORECOIN; MAIDSAFECOIN; KUCOIN SHARES; CRYPTO.COM; SOLVE; STATUS; MIXIN; WALTONCHAIN; GOLEM; INSIGHT CHAIN; DAI; VESTCHAIN; AELF; WAX; DIGIXDAO; LOOM NETWORK; NASH EXCHANGE; LATOKEN; HEDGETRADE; LOOPRING; REVAIN; DECENTRALAND; ORBS; NEXT, SANTIMENT NETWORK TOKEN; POPULOUS; NEXO; CELER NETWORK; POWER LEDGER; ODEM; KYBER NETWORK; QASH; BANCOR; CLIPPER COIN; MATIC NETWORK; POLYMATH; FUNFAIR; BREAD; IOTEX; ECOREAL ESTATE; REPO; UTRUST; ARCBLOCK; BUGGYRA COIN ZERO; LAMBDA; IEXEC RLC, STASIS EURS; ENIGMA; QUARKCHAIN; STORJ; UGAS; RIF TOKEN; JAPAN CONTENT TOKEN; FANTOM; EDUCARE; FUSION; GAS; MAINFRAME; BIBOX TOKEN; CRYPTO20; EGRETIA; REN; SYNTHETIX NETWORK TOKEN, VERITASEUM; CORTEX, CINDICATOR; CIVIC; RCHAIN; TENX; KIN; DAPS TOKEN; SINGULARITYNET; QUANT; GNOSIS; INO COIN; ICONOMI; MEDIBLOC [ERC20]; 0X; AION; ALGORAND; AMP; ARCA; ARWEA VE; AUDIUS; AVALANCHE; BCB; BCC; BITCOIN SV; BLOCKSTACKS; CBAT; CDAI; CELA; CELO; CETH; CHIA; CODA; COSMOS; CWBTC; CZRK; DECRED; DFINITY; EOS; ETH 2.0; FILECOIN; HEDGETRADE; ION; KADENA; KYBER NETWORK; MOBILECION; NEAR; NERVOS; OASIS, OMISEGO; PAXG; POLKADOT; SKALE; DIEM; SOLANA; STELLAR; TEZOS; THETA; XRP; DIEM and/or DEW, to name a few., to name a few), the amount of the type of fiat, and/or the amount of the type of digital asset, to name a few.

In embodiments the second machine-readable instructions may have been generated and stored in memory 5302-C and/or memory 5306-C prior to verifying the user login credentials. Once generated (and/or obtained from memory 5302-C and/or memory 5306-C), in embodiments, the second machine-readable instructions may be transmitted by the digital asset exchange computer system 5302 to the first user device 5304 via network 125. In embodiments, the second machine-readable instructions may be executed by the processor(s) 5304-A of the first user device 5304 (e.g., upon receipt of the first machine-readable instructions). Execution of the first machine-readable instructions, in embodiments, may result in the first user device 5304 displaying the first GUI. In response to the prompt, the first user may input and transmit to the digital asset exchange computer system 5302 a first request for a multi-leg transaction (e.g., a first order) including one or more of the following: the type of transaction, the type of fiat, the amount of fiat, the type of digital asset, and/or the amount of digital asset, to name a few.

The process, in embodiments, may continue at step S5310. At step S5310, in embodiments, the digital asset exchange computer system 5302 may receive a first request for a multileg transaction. The first request, in embodiments, may be received from the first user device 5304 via network 125 and/or the API 5302-D connection between the first user device 5304 and the digital asset exchange computer system 5302. The first request, for example, may be to exchange a first amount of British Pound for Zcash. In embodiments, not all currencies have pricing for a fiat to cryptocurrency exchange. For example, the exchange of British Pound to Zcash may be unavailable. In embodiments, the pricing may be available and the first request may be to exchange a first amount of British Pound for an amount of Zcash. In embodiments, the first request may be to exchange a first amount of Zcash for British pound. The process, as described herein, may be similar for both a multi-leg transaction of fiat to digital asset and/or a multi-leg transaction of digital asset to fiat.

The process, in embodiments, may continue at step S5312. At step S5312, in embodiments, the digital asset exchange computer system 5302 may obtain market data associated with the first request. Market data associated with the first request, in embodiments, may include one or more of the following: a first exchange rate of the first fiat (e.g., British Pound in the above example) to a second fiat (e.g., US Dollar, Euro, etc.); a second exchange rate of the second fiat to the first digital asset (e.g., Zcash in the above example); a first amount of time associated with the first exchange rate (e.g., the amount of time the exchange rate is valid); a second amount of time associated with the second exchange rate (e.g., the amount of time the exchange rate is valid); and/or information regarding one or more third party banks associated with the first exchange rate and/or second exchange rate, to name a few.

To obtain market data, in embodiments, the digital asset exchange computer system 5302 may generate and send a request for market data to a third-party bank, or other data source. Continuing the example, the generated request may include a request for a current exchange rate for British Pound to US Dollar. The request, in embodiments, may be sent by the digital asset exchange computer system 5302 to the third party bank(s) 5308 via network 125. In embodiments, the request may be sent to one or more third party banks via network 125 and/or an API connection between the digital asset exchange computer system 5302 and one or more third party banks 5308. In response to the request, the digital asset exchange computer system 5302 may receive one or more responses to the request for a current exchange rate. The one or more responses, in embodiments, may include one or more of the following: the inter-bank rate; the true exchange rate; one or more fees associated with the exchange rate; an amount of time the process of exchanging the fiat for fiat will take; and/or a time associated with the inter-bank rate and/or the true exchange rate (e.g., the amount of time the exchange rate is available), to name a few. In embodiments, the one or more responses to the one or more requests may be saved by the digital asset exchange computer system 5302 in memory 5302-C. The exchange rate selected, in embodiments, may be the exchange rate most favorable to one or more of the following: the first user, the digital asset exchange 5306, and/or the third party bank 5308, to name a few. In embodiments, the presence or lack thereof may be a filter used by the first user. In embodiments, a portion and/or all of the market data received by the digital asset exchange computer system 5302 may be presented to the first user. In embodiments, to obtain market data, the digital asset exchange computer system 5302 may periodically request one or more third party banks 5308 for market data and store the one or more responses. The periodic request may be at regular intervals, which may include one or more of the following: every hour, one or more times a day, one or more times a week, one or more times a month, and/or one or more times a year to name a few. The obtained market data, in embodiments, may be presented to one or more users of the digital asset exchange 5306. For example, the obtained market data may be presented in table and/or graph form via a website associated with the digital asset exchange 5306.

The process, in embodiments, may continue at step S5314. At step S5314, in embodiments, the digital asset exchange computer system 5302 may determine the exchange rate for the multi-leg transaction. The exchange rate for the multi-leg transaction may include the exchange rate for each leg of the multi-leg transaction and/or one or more fees associated with each leg of the multi-leg transaction, to name a few. Continuing the example, based on the obtained market data, the digital asset exchange computer system 5302 may determine that the first amount of British Pounds may be exchanged for a second amount of US Dollars. Continuing the example, the digital asset exchange 5306 may, in embodiments, have the US Dollar to Zcash exchange rate stored in memory 5306-C and/or 5302-C. Based on the stored exchange rate, the digital asset exchange computer system 5302 may determine that the second amount of US Dollars can be exchanged for a third amount of Zcash. The exchange rate, in this example, for the multi-leg transaction may be the first amount to the third amount. In embodiments, one or more of the legs of the multi-leg transaction may have a fee associated therewith. The fee(s) may also be included in the exchange rate for the multi-leg transaction (e.g., the second and third amounts would be less to account for the one or more fees). In embodiments, the determined exchange rate may be stored in memory 5306-C and/or 5302-C.

Figure 53C:
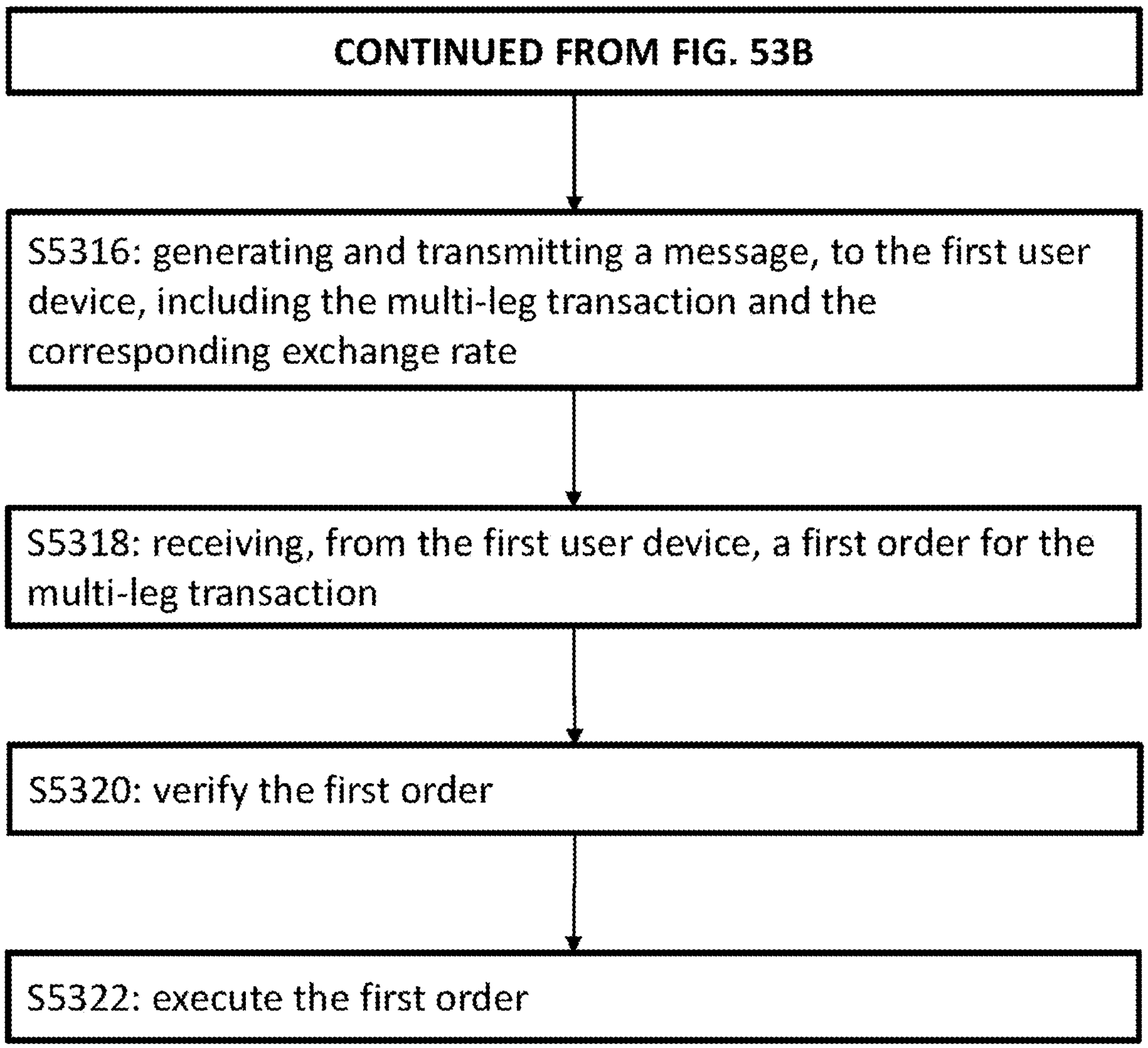

The process, in embodiments, may continue with the flow chart described in connection with FIG. 53C. Referring to FIG. 53C, in embodiments, the process may continue at step S5316. At step S5316, in embodiments, the digital asset exchange computer system 5302 may generate and send a message to the first user device 5. The message, in embodiments, may include one or more of the following: the multi-leg transaction (e.g., British Pounds to Zcash), the third amount (e.g., the third amount of Zcash), the exchange rate (e.g., the first amount to the third amount); an amount of time associated with the exchange rate associated with the multi-leg transaction (e.g., the exchange rate is good for 2 minutes); third machine-readable instructions; and/or information associated with one or more of the third party bank(s) 5308, to name a few. The third machine-readable instructions may, in embodiments, include one or more instructions to display a third GUI upon receipt of the third machine readable instructions. The third GUI, in embodiments, may display the message and a prompt to insert one or more user accounts associated with the multi-leg transaction and/or confirm whether the user would like to execute the multi-leg transaction. For example, the third GUI, which may be executed upon receipt by the first user device 5304, may cause the display of the first user device 5304 to display the following:

| | |
|---|---|
| Multi-Leg Transaction: | British Pounds to Zcash |
| Exchange Rate: | First amount to Third Amount |
| Exchange: | First amount of British Pounds for Third Amount of Zcash |
| Fiat Customer Account: | |
| Digital Asset Customer Account: | |
| ENTER AND CONFIRM | |

The fiat customer account, in embodiments, may be the account from which the first user will be withdrawing British Pounds for the Third Amount of Zcash. In embodiments, the digital asset customer account may be a destination account for the third amount of Zcash. For example, the digital asset customer account may be a public address (e.g., User 1 Public Address 1827) on the blockchain 6108.

In embodiments, as noted above, the first user public address (e.g., User 1 Public Address 1827) may correspond to a first user key pair. The first user key pair, in embodiments, may include a first user public key and a corresponding first user private key. The first user private key, in embodiments, may be mathematically related to the first user private key. Similarly, the digital asset exchange 5306 may be associated with the digital asset exchange public address 5310 on blockchain 6108. The digital asset exchange public address 5310 may correspond to a designated key pair. The designated key pair, in embodiments, may include a designated public key and a corresponding designated private key. The designated private key, in embodiments, may be mathematically related to the designated private key. The blockchain, in embodiments, may maintain a digital asset via a distributed public transaction ledger (e.g., in the form of a blockchain) by a plurality of geographically distributed computer systems in a peer-to-peer network in the form of a blockchain network.

The blockchain 6108, in embodiments, may maintain a digital asset on a distributed public transaction ledger. The digital asset, in embodiments, may be a digital math-based asset, such as BITCOIN, NAMECOINS, LITECOINS, PPCOINS, TONAL BITCOINS, BITCOIN CASH, ZCASH, IXCOINS, DEVCOINS, FREICOINS, I0COINS, TERRACOINS, LIQUIDCOINS, BBQCOINS, BITBARS, PHENIXCOINS, RIPPLE, DOGECOINS, BARNBRIDGE, POLYGON, SOMNIUM SPACE, OCEAN PROTOCOL, SUSHISWAP, INJECTIVE, LIVEPEER, MASTERCOINS, BLACKCOINS, ETHER, NXT, BITSHARES-PTS, QUARK, PRIMECOIN, FEATHERCOIN, PEERCOIN, FACEBOOK GLOBAL COIN, STELLAR, TOP 100 TOKENS, TETHER; MAKER; CRYPTO.COM CHAIN, BASIC ATTENTION TOKEN, USD COIN; CHAINLINK; BITTORRENT; OMISEGO; HOLO; TRUEUSD; PUNDI X; ZILLIQA; ATOM, AUGUR; 0X; AURORA; PAXOS STANDARD TOKEN; HUOBI TOKEN; IOST; DENT; QUBITICA; ENJIN COIN, MAXIMINE COIN, THORECOIN; MAIDSAFECOIN; KUCOIN SHARES; CRYPTO.COM; SOLVE; STATUS; MIXIN; WALTONCHAIN; GOLEM; INSIGHT CHAIN, DAI; VESTCHAIN; AELF; WAX; DIGIXDAO, LOOM NETWORK; NASH EXCHANGE; LATOKEN; HEDGETRADE; LOOPRING; REVAIN; DECENTRALAND; ORBS; NEXT; SANTIMENT NETWORK TOKEN; POPULOUS, NEXO; CELER NETWORK; POWER LEDGER, ODEM; KYBER NETWORK; QASH; BANCOR; CLIPPER COIN; MATIC NETWORK; POLYMATH; FUNFAIR; BREAD, IOTEX, ECOREAL ESTATE; REPO; UTRUST, ARCBLOCK; BUGGYRA COIN ZERO; LAMBDA; IEXEC RLC; STASIS EURS; ENIGMA; QUARKCHAIN; STORJ, UGAS; RIF TOKEN, JAPAN CONTENT TOKEN; FANTOM, EDUCARE; FUSION; GAS; MAINFRAME; BIBOX TOKEN; CRYPTO20; EGRETIA; REN; SYNTHETIX NETWORK TOKEN; VERITASEUM; CORTEX; CINDICATOR; CIVIC; RCHAIN; TENX; KIN, DAPS TOKEN; SINGULARITYNET; QUANT; GNOSIS; INO COIN; ICONOMI; MEDIBLOC [ERC20]; 0X; AION; ALGORAND; AMP; ARCA; ARWEAVE; AUDIUS; AVALANCHE, BCB; BCC; BITCOIN SV; BLOCKSTACKS; CBAT; CDAI; CELA; CELO; CETH; CHIA; CODA; COSMOS; CWBTC; CZRK; DECRED; DFINITY; EOS; ETH 2.0; FILECOIN, HEDGETRADE; ION, KADENA; KYBER NETWORK, MOBILECION; NEAR, NERVOS; OASIS; OMISEGO; PAXG; POLKADOT; SKALE; DIEM; SOLANA; STELLAR; TEZOS; THETA; XRP; DIEM and/or DEW, to name a few. In embodiments, the underlying digital asset may be a digital asset that is supported by its own digital asset network (like ETHER supported by the ETHEREUM Network, NEO supported by the NEO Network, to name a few). A digital asset token, in embodiments, may be a stable value token (such as GEMINI DOLLAR, PAXG, EFIL, EDOT, EXTZ, EATOM, to name a few), digital finance tokens that may be associated with decentralized lending (such as AMP, COMPOUND, PROTOCOL, KYBER, UMA, UNISWAP, YEARN, AAVE, to name a few), tokens, non-fungible token (such as CRYPTOKITTIES, Sorar, Decentraland, Goods Unchained, My Crypto Heroes, to name a few), and/or gaming tokens (such as SANDBOX), to name a few. The digital asset token, in embodiments, may be a stable value token (such as GEMINI DOLLAR), security tokens, and/or non-fungible token (such as CRYPTOKITTIES), to name a few. Unlike other types of digital asset tokens, a CRYPTOKITTY is a non-fungible token. A non-fungible token is a token which can represent assets like art, collectibles, games, real estate, to name a few, and are considered unique, e.g., no two non-fungible tokens are identical. In embodiments, tokens may be based on standards such as ERC-720, ERC-721, ERC-1155, to name a few. Non-fungible tokens can also be used in games, such as Sorare—With 100 soccer clubs officially licensed,

- Sorare lets you purchase NFTs that represent professional soccer players that can be used to play fantasy games against other collectors.
- Decentraland—Decentraland is a virtual reality universe similar to The Sims or Second Life. Inhabitants of Decentraland buy, sell, and exchange ERC-721 tokens called LAND and use an ERC-20 token called MANA to purchase other in-universe items. Inside Decentraland, there are art shows, games, and specialized events users can participate in.
- Gods Unchained—Gods Unchained is a turn-based collectible card game. NFT cards depict various characters, creatures, events, and powers, which can be used to play one-on-one against an opponent.
- My Crypto Heroes—A multiplayer role-playing game, My Crypto Heroes issues NFTs of characters and other in-game items. Players level up their characters through battles and quests.

A non-fungible token may be stored on a peer-to-peer distributed network in the form of a blockchain network (or other distributed networks). Examples of non-fungible tokens include one or more of the following: CRYPTOKITTIES, CRYPTOFIGHTERS, DECENTRALAND, ETHERBOTS, ETHERMON, RARE PEPPES, SPELLS OF GENESIS, CRAFTY, SUPERARRE, TERRA0, UNICO, to name a few. In embodiments, non-fungible tokens, (e.g., 5 CRYTPOKITTIES) may be transferable and accounted for as a digital asset token on an underlying blockchain network (e.g., ETHEREUM Network). In embodiments, a first non-fungible token (e.g., a First CryptoKitty) may have attributes (e.g., characteristics of a non-fungible token) that are different from a second non-fungible token (e.g., a Second CryptoKitty), even if both are the same type of non-fungible token (e.g., a CRYPTOKITTY). For example, the First CryptoKitty may be a striped CRYTPOKITTIES, while the Second CryptoKitty may be a droopy-eyed CRYTPOKITTIES. In embodiments, the attributes of each non-fungible tokens may be customizable.

In response to the message received by the digital asset exchange computer system 5302, in embodiments, the first user may enter one or more of the following: a fiat customer account associated with the first user, a digital asset customer account associated with the first user, and/or confirmation of the multi-leg transaction. In embodiments, the first user device 5304 may generate and send a message including an order for the multi-leg transaction. The order, in embodiments, may include one or more of the following: the multi-leg transaction (e.g., British Pounds to ZCASH), the third amount (e.g., the third amount of Zcash), the exchange rate (e.g., the first amount to the third amount); a fiat customer account associated with the first user; and/or a digital asset customer account associated with the first user, to name a few. In embodiments, the fiat customer account associated with the first user and/or the digital asset customer account associated with the first user may also be associated with the digital asset exchange 5306. The message, in embodiments, may be sent to the digital asset exchange computer system 5302 from the first user device 5304 via network 125 and/or API 5302-D.

The process, in embodiments, may continue at step S5318. At step S5318, in embodiments, the digital asset exchange computer system 5302 may receive, from the first user device, a first order for the multi-leg transaction. The first order, in embodiments, may include one or more of the following: the multi-leg transaction (e.g., British Pounds to ZCASH), the third amount (e.g., the third amount of Zcash), the exchange rate (e.g., the first amount to the third amount); a fiat customer account associated with the first user; and/or a digital asset customer account associated with the first user, to name a few.

The process, in embodiments, may continue at step S5320. At step S5320, in embodiments, the digital asset exchange computer system 5302 may verify the first order. The first order, in embodiments, may be verified by confirming one or more of the following: the first user is an authorized customer of the digital asset exchange 5306, the first user confirmed the details of the multi-leg transaction; and/or the first user has sufficient funds for the multi-leg transaction (e.g., the first amount of either the first fiat—e.g., British Pound—or the first digital asset—in the embodiments of exchanging the first digital asset for a first fiat), to name a few. If the digital asset exchange computer system 5302 does not or cannot verify the first order, the process may continue with the digital asset exchange computer system 5302 generating and sending a notification to the first user device 5304 indicating that the multi-leg transaction will not be processed. In embodiments, if the digital asset exchange computer system 5302 verifies the first order, the digital asset exchange computer system 5302 may generate and send a confirmation message to the first user device 5304 indicating that the first order was received and/or verified.

The process, in embodiments, may continue at step S5322. At step S5322, in embodiments, the digital asset exchange computer system 5302 may execute the first order. The first order may be executed either immediately and/or at a later time and/or date. For example, the first order may be executed internally on order books immediately. As another example, the first order may be executed—e.g., with the third party bank(s) 5308—when one or more of the following occurs: a predetermined amount of orders have been verified; a predetermined amount of digital asset has been ordered to be traded via a multi-leg transaction; a predetermined amount of a type of fiat has been ordered to be traded via a multi-leg transaction; and/or a predetermined amount of asset associated with a third-party bank has been ordered to be traded via a multi-leg transaction, to name a few. In embodiments, the first user may receive the third amount of digital asset (or the third amount of fiat) once the order is verified by the digital asset exchange computer system 5302 via an update of one or more transaction ledgers of the digital asset exchange 5306. Exemplary processes for executing the first order are described in connection with the descriptions of FIGS. 53D and 53E—describing executing a multi-leg transaction of fiat to digital asset and a multi-leg transaction of digital asset to fiat, respectively.

Figure 53D:
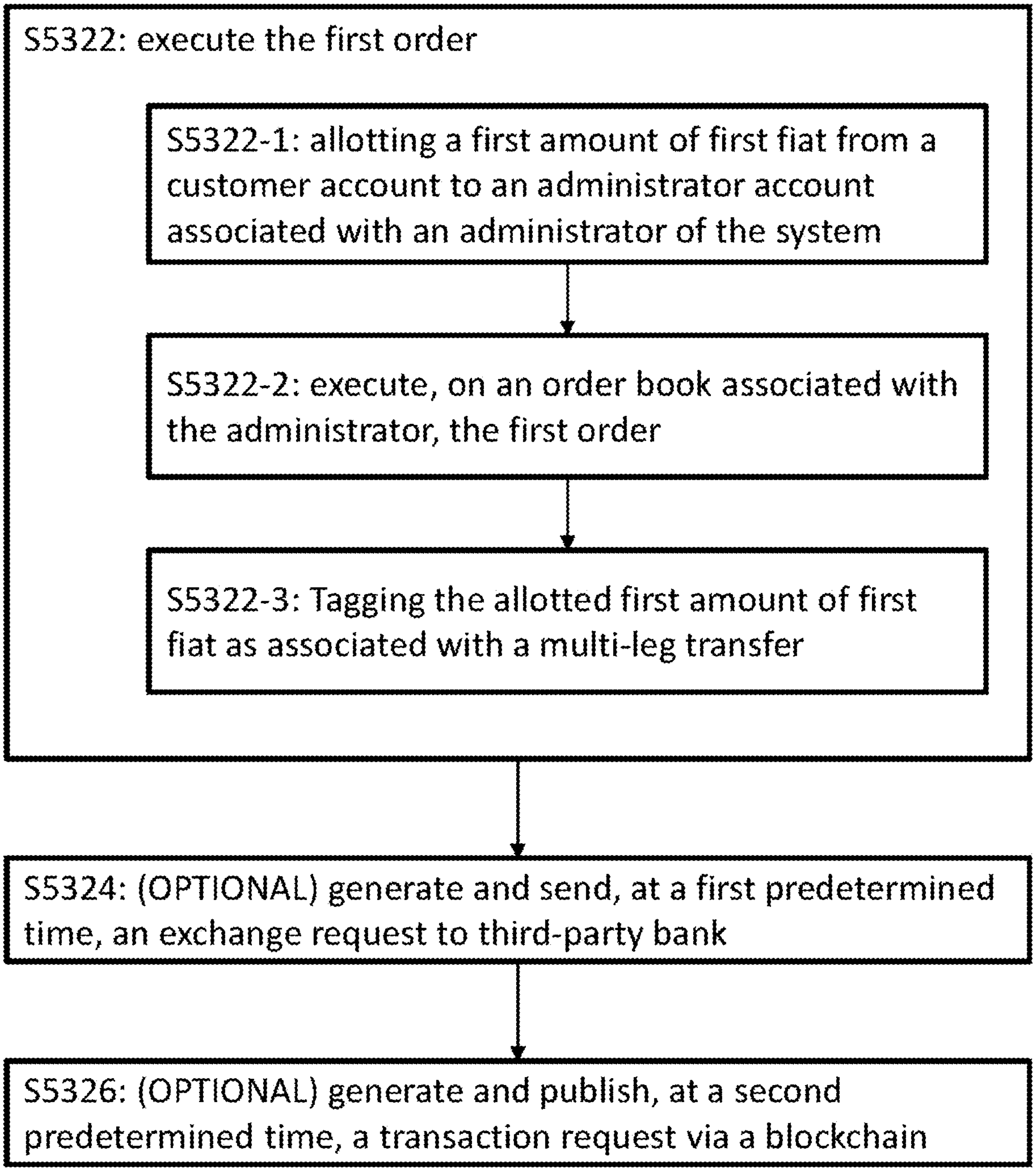
FIGS. 53D-53E are exemplary flow charts of processes for executing a multi-leg transaction in accordance with exemplary embodiments of the present invention.

The process of executing the first order for a multi-leg transaction exchanging the first fiat for a first digital asset may be performed in accordance with one or more steps illustrated in FIG. 53D. Referring to FIG. 53D, in embodiments, the process for executing the first order may begin with a step S5322-1. At step S5322-1, in embodiments, the digital asset exchange computer system 5302 may allot a first amount of the first fiat from a customer account to an administrator account associated with the digital asset exchange 5306. Once the first order has been verified by the digital asset exchange computer system 5302, the first amount of fiat, in custody of the first user fiat account, may be allotted (e.g., placed on hold) by the digital asset exchange computer system 5302 in preparation for the multi-leg transaction.

In embodiments, the process for executing the first order may continue with a step S5322-2. At step S5322-2, in embodiments, the digital asset exchange computer system 5302 may execute, on an order book associated with the digital asset exchange 5306, the first order. The allotted first amount of the first fiat, for example, may be transferred from the first user fiat account to an account associated with the digital asset exchange computer system 5302 by updating one or more transaction ledgers of the digital asset exchange 5306.

In embodiments, the process for executing the first order may continue with a step S5322-3. At step S5322-3, in embodiments, the digital asset exchange computer system 5302 may tag the allotted first amount of the first fiat as associated with a multi-leg transaction. The first amount of first fiat, for example, may be tagged, by the digital asset exchange computer system 5302, as fiat intended for a multi-leg transaction. The tag, in embodiments, may include one or more of the following: the third party bank to be exchanged with; the second type of fiat the first fiat will be exchanged for; the quoted exchange rate; fees associated with the exchange; and/or an identifier associated with the multi-leg transaction, to name a few.

In embodiments, the process may continue with step S5324. At step S5324, in embodiments, the digital asset exchange computer system 5302 may generate and send an exchange request to a third-party bank. The exchange request, in embodiments, may be sent at a first predetermined time. The exchange request may include one or more of the following: the second type of fiat the first fiat will be exchanged for; the quoted exchange rate; fees associated with the exchange; an identifier associated with the received quote; and/or an identifier associated with the multi-leg transaction, to name a few. In embodiments, the first predetermined amount of time may be one or more of the following: immediate; when the second predetermined amount of time elapses; at close of business; at a predetermined date and/or time; when the price associated with the exchange is at a predetermined exchange rate; when a predetermined amount of orders have been verified; when a predetermined amount of digital asset has been ordered to be traded via a multi-leg transaction; when a predetermined amount of a type of fiat has been ordered to be traded via a multi-leg transaction; and/or when a predetermined amount of asset associated with a third-party bank has been ordered to be traded via a multi-leg transaction, to name a few. The exchange request, may, in embodiments, be sent to the one or more third party bank(s) 5308 via network 125 and/or an API. Once sent, the exchange may be executed by the one or more third party bank(s) 5308, resulting in the receipt of the second amount of second fiat by the digital asset exchange computer system 5302 and/or digital asset exchange 5306.

In embodiments, the process may continue with step S5326. At step S5326, in embodiments, the digital asset exchange computer system 5302 may generate and publish via the blockchain 6108, a transaction request. The transaction request, in embodiments, may be to send the third amount of digital asset from the digital asset exchange public address 5310 to the User 1 public address 1827. In embodiments, the transaction request may be digitally signed by the exchange private key. Once published, the transaction request may be verified and/or executed on the blockchain 6108. The transaction request, in embodiments, may be published at a second predetermined time. In embodiments, the second predetermined amount of time may be one or more of the following: immediate; when the first predetermined amount of time elapses; at close of business; at a predetermined date and/or time; when the price associated with the exchange is at a predetermined exchange rate; when a predetermined amount of orders have been verified; when a predetermined amount of digital asset has been ordered to be traded via a multi-leg transaction; when a predetermined amount of a type of flat has been ordered to be traded via a multi-leg transaction; and/or when a predetermined amount of asset associated with a third-party bank has been ordered to be traded via a multi-leg transaction, to name a few.

Figure 53E:
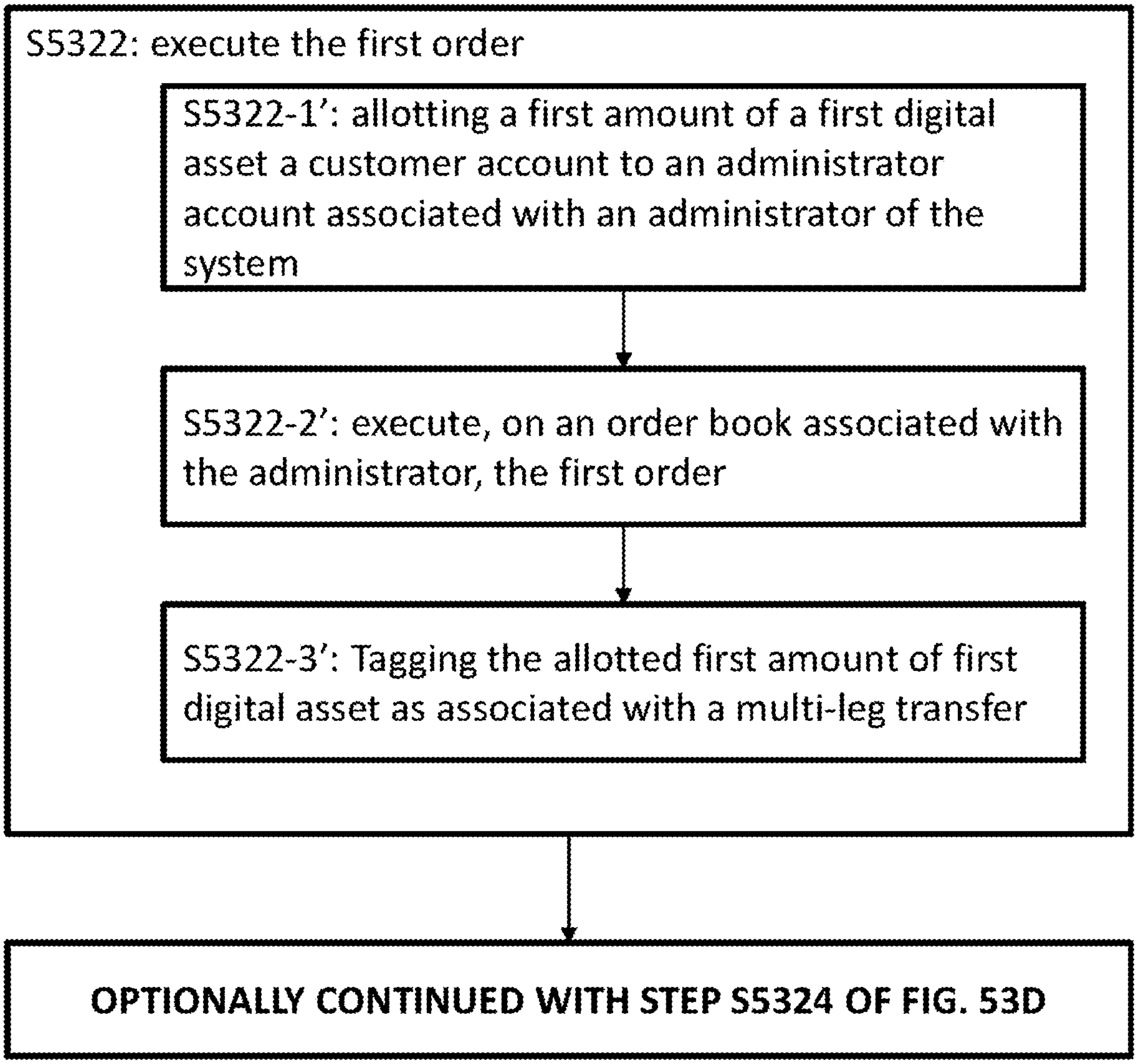

The process of executing the first order for a multi-leg transaction exchanging a first digital asset for a first fiat may be performed in accordance with one or more steps illustrated in FIG. 53E. Referring to FIG. 53E, in embodiments, the process for executing the first order may begin with a step S5322-1'. At step S5322-1', in embodiments, the digital asset exchange computer system 5302 may allot a first amount of the digital asset from a customer account (e.g., an account associated with the first user and the digital asset exchange 5306) to an administrator account associated with the digital asset exchange 5306. Once the first order has been verified by the digital asset exchange computer system 5302, the first amount of digital asset, in custody of the first user account, may be allotted (e.g., placed on hold) by the digital asset exchange computer system 5302 in preparation for the multi-leg transaction.

In embodiments, the process for executing the first order may continue with a step S5322-2'. At step S5322-2', in embodiments, the digital asset exchange computer system 5302 may execute, on an order book associated with the digital asset exchange 5306, the first order. The allotted first amount of the first digital asset, for example, may be transferred from the first user account to the administrator account associated with the digital asset exchange computer system 5302 by updating one or more transaction ledgers of the digital asset exchange 5306.

In embodiments, the process for executing the first order may continue with a step S5322-3'. At step S5322-3', in embodiments, the digital asset exchange computer system 5302 may tag the allotted first amount of the first digital asset as associated with a multi-leg transaction. The first amount of first digital asset, for example, may be tagged, by the digital asset exchange computer system 5302, as digital asset intended for a multi-leg transaction. The tag, in embodiments, may include one or more of the following: the third party bank to be exchanged with; the type of fiat the first fiat will be exchanged for; the quoted exchange rate; fees associated with the exchange; and/or an identifier associated with the multi-leg transaction, to name a few.

In embodiments, the process may continue with step S5324 of FIG. 53D, the description of which applying herein.

In embodiments, as described herein, the first user device 5304 may be connected via an API with the digital asset exchange computer system 5302. In embodiments, the first user device 5304 may initiate the connection with the digital asset exchange computer system 5302 by transmitting a connection request to the digital asset exchange computer system 5302 via network 125. The connection request may include a request to set up a channel (e.g., via the API 5302-D) for the purposes of setting up and executing a multi-leg transaction on the digital asset exchange 5306. A multi-leg transaction, in embodiments, may refer to a user transferring one or more digital assets and/or one or more fiat or types of fiat for one or more digital assets and/or one or more fiat or types of fiat. In embodiments, the first user device 5304 may be a plurality of electronic devices. In embodiments, the first user device 5304 may be a mobile electronic device operating a mobile application for the purposes of trading on the digital asset exchange 5302. The digital asset exchange computer system 5302, in the embodiments where the first user device 5304 is a plurality of electronic devices, may be able to communicate with the plurality of electronic devices via the API 5302-D. In embodiments, each of the plurality of electronic devices may communicate with the digital asset exchange computer system 5302, each using a bi-directional channel dedicated to one device of the plurality of electronic devices. The use of bi-directional channels to carry out transactions is discussed in further detail below (e.g., one or more of the transactions described in connection with FIGS. 53A-53E, 46, 40A-40C, 41-42, 43A-43B, and 44-45, to name a few). An API, as used herein, may refer to machine-readable software that enables two applications to communicate and/or transfer information.

The steps of the process(s) described in connection with FIGS. 53A-53E may be rearranged or omitted.

In embodiments, a method comprises: (A) providing, by an exchange computer system associated with a digital asset exchange, one or more electronic databases stored on one or more computer-readable media operatively connected to the exchange computer system, the one or more electronic databases comprising: (1) one or more customer account databases comprising: (a) a first customer fiat balance associated with a first customer fiat account associated with a first customer, wherein the first customer fiat balance indicates a first amount of a first fiat owned by the first customer, and wherein the first fiat is a first type of fiat of a plurality of types of fiat; (b) a first customer digital asset balance associated with a first customer digital asset account associated with the first customer, wherein the first customer digital asset balance indicates a second amount of a first digital asset owned by the first customer, and wherein the first digital asset is a first type of digital asset of a plurality of types of digital asset; and (c) first verified customer credentials associated with the first customer; (2) one or more market databases comprising: (a) a plurality of fiat values, each of the plurality of values corresponding to a type of fiat of a first plurality of types of fiat; and (b) a plurality of digital asset values associated with a first plurality of types of fiat, (3) one or more transaction ledgers, comprising a plurality of transactions performed by the digital asset exchange; (4) one or more accounting databases associated with funds associated with the digital asset exchange, wherein the funds associated with the digital asset exchange comprise: (a) a second plurality of types of fiat, wherein the second plurality of types of fiat is of the first plurality of types of fiat; and (b) a second plurality of types of digital asset, wherein the second plurality of types of digital asset is of the first plurality of types of digital asset; and (5) a third-party database comprising exchange information corresponding to one or more third-party exchanges, (B) generating, by the exchange computer system, first machine-readable instructions comprising one or more instructions to display a first graphical user interface (GUI), wherein the first GUI includes a prompt for customer credentials; (C) transmitting, by the exchange computer system, the first machine-readable instructions such that the first GUI is displayed on a first user device associated with the first customer; (D) receiving, by the exchange computer system from the first user device, first user credentials; (E) verifying, by the exchange computer system, the received first user credentials by comparing the received first user credentials to the first verified customer credentials; (F) generating, by the exchange computer system, second machine-readable instructions comprising one or more instructions to display a second GUI, wherein the second GUI includes a first request for information associated with a first multi-leg transaction; (G) transmitting, by the exchange computer system, the second machine-readable instructions such that the second GUI is displayed on the first user device; (H) receiving, by the exchange computer system from the first user device, a second request for the multi-leg transaction, wherein the second request includes: a fiat type, wherein the fiat type is the first type of fiat; (1) an amount of fiat of the fiat type, wherein the amount of the first type of fiat is a third amount; (2) a digital asset type, wherein the digital asset type is a second type of digital asset; and (3) a first leg of the multi-leg transaction, wherein the first leg indicates the multi-leg transaction is to exchange the third amount of the first type of fiat for an amount of the second type of digital asset; (I) determining, by the exchange computer system, a first exchange rate corresponding to a first exchange of the first type of fiat for the second type of digital asset, wherein the first exchange rate is determined by performing the following steps: (1) obtaining, by the exchange computer system at a first predetermined time, first market data by: (a) generating, by the exchange computer system at the first predetermined time, a third request for first market data indicating a second exchange rate corresponding to a second exchange of the first type of fiat for a second type of fiat, wherein the second type of fiat is of the plurality of types of fiat; (b) transmitting, by the exchange computer system to a first third-party exchange of the one or more third-party exchanges, the third request; and (c) receiving, by the exchange computer system from the first third-party exchange, the first market data comprising the second exchange rate, wherein the second exchange rate indicates a fiat exchange of a third amount of the first fiat results in a fifth amount of the second type of fiat; (2) obtaining, by the exchange computer system at a second predetermined time, second market data by accessing the one or more market databases, wherein the second market data indicating a third exchange rate corresponding to a third exchange of the second type of fiat for the second type of digital asset; and (3) calculating, by the exchange computer system, the first exchange rate based at least on: (a) the second exchange rate; and (b) the third exchange rate; (J) determining, by the exchange computer system, a fourth amount of the second type of digital asset by multiplying the third amount by the first exchange rate; (K) generating, by the exchange computer system, third machine-readable instructions comprising one or more instructions to display a third GUI, wherein the third GUI includes: (1) the multi-leg transaction; (2) the third amount of the first type of fiat; (3) the first exchange rate; and (4) the fourth amount of the second type of digital asset; (L) transmitting, by the exchange computer system, the third machine-readable instructions such that the third GUI is displayed on the first user device; (M) receiving, by the exchange computer system from the first user device, a first order to exchange the third amount of the first type of fiat for the fourth amount of the second type of digital asset; (N) verifying, by the exchange computer system, the first order by verifying one or more of the following: (1) the third amount of the first fiat is less than the first amount of fiat; (2) the third amount of the first fiat is less than or equal to the first amount of fiat; (3) the first customer is authorized to order the multi-leg transaction; and (4) the fourth amount of the second type of digital asset is available to the digital asset exchange, wherein the availability of the fourth amount of the second type of digital asset is confirmed by accessing the one or more accounting databases; (0) allotting, by the exchange computer system, the third amount of the first flat from the first customer fiat account to a different account associated with the digital asset exchange; (Q) allotting, by the exchange computer system, the fourth amount of the second type of digital asset to the first customer digital asset account; (R) executing, by the exchange computer system, the multi-leg transaction by updating: (1) the one or more transaction ledgers to indicate: (a) the third amount of the first fiat was withdrawn from first customer fiat account; and (b) the fourth amount of the second type of digital asset was deposited in the first customer digital asset account; and (2) the one or more customer account databases to indicate: (a) the third amount of the first fiat was withdrawn from first customer fiat account; and (b) the fourth amount of the second type of digital asset was deposited in the first customer digital asset account; and (S) assigning, by the exchange computer system, a first tag to the allotted third amount of first fiat, wherein the first tag indicates the third amount of the first fiat was received by the digital asset exchange as part of the multi-leg transaction.

In embodiments, the method further comprises: (T) generating, by the exchange computer system at second predetermined time, a first transaction request to transfer the fourth amount of the second type of digital asset from an exchange public address associated with an underlying digital asset to a first user public address associated with the underlying digital asset, wherein the exchange public address is associated with the digital asset exchange, wherein the exchange public address corresponds to a first key pair comprising an exchange public key and a corresponding exchange private key, wherein the exchange private key is mathematically related to the exchange public key, wherein the first transaction request is digitally signed by the exchange private key, wherein the first user public address is associated with the first customer, wherein the first user public address corresponds to a second key pair comprising a first public key and a corresponding first private key, wherein the first private key is mathematically related to the first public key, and wherein the underlying digital asset is maintained on a distributed public transaction ledger maintained in the form of a blockchain by a plurality of geographically distributed computer systems in a peer-to-peer network; and (U) publishing, by the exchange computer system via the blockchain, the first transaction request. In embodiments the second predetermined time occurs at one or more of the following: (1) following generating the first transaction request; (2) close of business; (3) when the third exchange rate is at a predetermined value; and (4) at the occurrence of an event. In embodiments, the event occurs when a plurality of multi-leg transactions associated with the second type of digital asset are ordered by at least one customer of the digital asset exchange.

In embodiments, the method further comprises: (T) generating, by the exchange computer system at second predetermined time, a message to the first third-party exchange, wherein the message comprises: (1) a fourth request to exchange the third amount of the first fiat for the fifth amount of the second type of fiat; and (2) the first market data; (U) transmitting, at a third predetermined time, by the exchange computer system to the third-party exchange, the message; and (V) receiving, by the digital asset exchange via the exchange computer system, the fifth amount of the second type of fiat. In embodiments, the second predetermined time occurs at one or more of the following: (1) following generating the message; (2) close of business; (3) when the second exchange rate is at a predetermined value, and (4) at the occurrence of an event. In embodiments, the event occurs when a plurality of multi-leg transactions associated with the second type of fiat are ordered by at least one customer of the digital asset exchange.

In embodiments, the first type of digital asset is BITCOIN.

In embodiments, the first type of digital asset is ETHER.

In embodiments, the first type of digital asset is LITECOIN.

In embodiments, the first type of digital asset is BITCOIN cash.

In embodiments, the first type of digital asset is ZCASH.

In embodiments, the first type of digital asset is a digital asset token. In embodiments, the first type of digital asset token is Gemini dollar.

In embodiments, the first type of fiat is United States Dollar.

In embodiments, wherein the first type of fiat is Euro.

In embodiments, wherein the first type of fiat is Russian Rubie.

In embodiments, wherein the first type of fiat is Rwandan Franc.

In embodiments, wherein the first type of fiat is Seychellois Rupee.

In embodiments, the second type of fiat is one of the following: (1) United States Dollar; (2) Euro; (3) British Pound; and (4) Yen.

In embodiments, a method comprises: (A) providing, by an exchange computer system associated with a digital asset exchange, one or more electronic databases stored on one or more computer-readable media operatively connected to the exchange computer system, the one or more electronic databases comprising: (1) one or more customer account databases comprising: (a) a first customer flat balance associated with a first customer fiat account associated with a first customer, wherein the first customer fiat balance indicates a first amount of a first fiat owned by the first customer, and wherein the first fiat is a first type of fiat of a plurality of types of fiat; (b) a first customer digital asset balance associated with a first customer digital asset account associated with the first customer, wherein the first customer digital asset balance indicates a second amount of a first digital asset owned by the first customer, and wherein the first digital asset is a first type of digital asset of a plurality of types of digital asset; and (c) first verified customer credentials associated with the first customer; (2) one or more market databases comprising: (a) a plurality of fiat values, each of the plurality of values corresponding to a type of flat of a first plurality of types of fiat; and (b) a plurality of digital asset values associated with a first plurality of types of fiat; (3) one or more transaction ledgers, comprising a plurality of transactions performed by the digital asset exchange; (4) one or more accounting databases associated with funds associated with the digital asset exchange, wherein the funds associated with the digital asset exchange comprise: (a) a second plurality of types of fiat, wherein the second plurality of types of fiat is of the first plurality of types of fiat; and (b) a second plurality of types of digital asset, wherein the second plurality of types of digital asset is of the first plurality of types of digital asset; and (5) a third-party database comprising exchange information corresponding to one or more third-party exchanges, (B) generating, by the exchange computer system, first machine-readable instructions comprising one or more instructions to display a first graphical user interface (GUI), wherein the first GUI includes a prompt for customer credentials; (C) transmitting, by the exchange computer system, the first machine-readable instructions such that the first GUI is displayed on a first user device associated with the first customer; (D) receiving, by the exchange computer system from the first user device, first user credentials; (E) verifying, by the exchange computer system, the received first user credentials by comparing the received first user credentials to the first verified customer credentials; (F) generating, by the exchange computer system, second machine-readable instructions comprising one or more instructions to display a second GUI, wherein the second GUI includes a first request for information associated with a first multi-leg transaction; (G) transmitting, by the exchange computer system, the second machine-readable instructions such that the second GUI is displayed on the first user device; (H) receiving, by the exchange computer system from the first user device, a second request for the multi-leg transaction, wherein the second request includes: a digital asset type, wherein the digital asset type is the first type of digital asset; an amount of digital asset of the digital asset type, wherein the amount of the first type of digital asset is a third amount; a fiat type, wherein the flat type is a second type of fiat asset; and a first leg of the multi-leg transaction, wherein the first leg indicates the multi-leg transaction is to exchange the third amount of the first type of digital asset for an amount of the second type of fiat; (I) determining, by the exchange computer system, a first exchange rate corresponding to a first exchange of the first type of digital asset for the second type of fiat, wherein the first exchange rate is determined by performing the following steps: (1) obtaining, by the exchange computer system at a first predetermined time, first market data by: (a) generating, by the exchange computer system at the first predetermined time, a third request for first market data indicating a second exchange rate corresponding to a second exchange of the second type of fiat for a third type of fiat, wherein the third type of fiat is of the plurality of types of fiat; (b) transmitting, by the exchange computer system to a first third-party exchange of the one or more third-party exchanges, the third request; and (c) receiving, by the exchange computer system from the first third-party exchange, the first market data comprising the second exchange rate, (2) obtaining, by the exchange computer system at a second predetermined time, second market data by accessing the one or more market databases, wherein the second market data indicating a third exchange rate corresponding to a third exchange of the first type of digital asset for the third type of fiat; and (3) calculating, by the exchange computer system, the first exchange rate based at least on: (a) the second exchange rate; and (b) the third exchange rate; (J) determining, by the exchange computer system, a fourth amount of the second type of fiat by multiplying the third amount by the first exchange rate; (K) generating, by the exchange computer system, third machine-readable instructions comprising one or more instructions to display a third GUI, wherein the third GUI includes: (1) the multi-leg transaction; (2) the third amount of the first type of digital asset; (3) the first exchange rate; and (4) the fourth amount of the second type of fiat; (L) transmitting, by the exchange computer system, the third machine-readable instructions such that the third GUI is displayed on the first user device; (M) receiving, by the exchange computer system from the first user device, a first order to exchange the third amount of the first type of digital asset for the fourth amount of the second type of fiat; (N) verifying, by the exchange computer system, the first order by verifying one or more of the following: (1) the third amount of the first digital asset is less than the second amount of first digital asset; (2) the third amount of the first digital asset is less than or equal to the second amount of first digital asset; and (3) the first customer is authorized to order the multi-leg transaction; (O) allotting, by the exchange computer system, the third amount of the first digital asset from the first customer digital asset account to a different account associated with the digital asset exchange; (Q) allotting, by the exchange computer system, the fourth amount of the second type of fiat to the first customer fiat account; (R) executing, by the exchange computer system, the multi-leg transaction by updating: (1) the one or more transaction ledgers to indicate: (a) the third amount of the first digital asset was withdrawn from first customer digital asset account; and (b) the fourth amount of the second type of fiat was deposited in the first customer fiat account; and (2) the one or more customer account databases to indicate: (a) the third amount of the first digital asset was withdrawn from first customer digital asset account; and (b) the fourth amount of the second type of fiat was deposited in the first customer fiat account; and (S) assigning, by the exchange computer system, a first tag to the allotted third amount of first digital asset, wherein the first tag indicates the third amount of the first digital asset was received by the digital asset exchange as part of the multi-leg transaction.

In embodiments, the method further comprises: (T) generating, by the exchange computer system at second predetermined time, a first transaction request to transfer the third amount of the first type of digital asset from a first user public address associated with an underlying digital asset to an exchange public address associated with the underlying digital asset, wherein the exchange public address is associated with the digital asset exchange, wherein the exchange public address corresponds to a first key pair comprising an exchange public key and a corresponding exchange private key, wherein the exchange private key is mathematically related to the exchange public key, wherein the first transaction request is digitally signed by the exchange private key, wherein the first user public address is associated with the first customer, wherein the first user public address corresponds to a second key pair comprising a first public key and a corresponding first private key, wherein the first private key is mathematically related to the first public key, and wherein the underlying digital asset is maintained on a distributed public transaction ledger maintained in the form of a blockchain by a plurality of geographically distributed computer systems in a peer-to-peer network; (U) publishing, by the exchange computer system via the blockchain, the first transaction request; and (V) receiving, by the exchange computer system at the exchange public address, the third amount of the first type of digital asset. In embodiments, wherein the second predetermined time occurs at one or more of the following: (1) following generating the first transaction request; (2) close of business; (3) when the third exchange rate is at a predetermined value; and (4) at the occurrence of an event. In embodiments, the event occurs when a plurality of multi-leg transactions associated with the first type of digital asset are ordered by at least one customer of the digital asset exchange.

In embodiments, the method further comprises: (T) generating, by the exchange computer system at second predetermined time, a message to the first third-party exchange, wherein the message comprises: (1) a fourth request to exchange an amount of the third type of fiat for the fourth amount of the second type of fiat; and (2) the first market data; (U) transmitting, at a third predetermined time, by the exchange computer system to the third-party exchange, the message; and (V) receiving, by the digital asset exchange via the exchange computer system, the fourth amount of the second type of fiat. In embodiments, the second predetermined time occurs at one or more of the following: (1) following generating the message; (2) close of business; (3) when the second exchange rate is at a predetermined value; and (4) at the occurrence of an event. In embodiments, the event occurs when a plurality of multi-leg transactions associated with the second type of fiat are ordered by at least one customer of the digital asset exchange.

In embodiments, the first type of digital asset is BITCOIN.

In embodiments, the first type of digital asset is ETHER.

In embodiments, the first type of digital asset is LITECOIN.

In embodiments, the first type of digital asset is BITCOIN cash.

In embodiments, the first type of digital asset is ZCASH.

In embodiments, the first type of digital asset is a digital asset token. In embodiments, the first type of digital asset token is Gemini dollar.

In embodiments, the third type of fiat is United States Dollar.

In embodiments, the third type of fiat is Euro.

In embodiments, the third type of fiat is Russian Rubie.

In embodiments, the third type of flat is Rwandan Franc.

In embodiments, the third type of fiat is Seychellois Rupee.

In embodiments, the second type of fiat is one of the following: (1) United States Dollar, (2) Euro; (3) British Pound; and (4) Yen.

In embodiments, the first leg of the multi-leg transaction is received by the exchange computer system over an established connection between the exchange computer system and the first user device, and wherein the established connection is a channel.

In embodiments, a method of issuing electronic payments using a fiat-backed digital asset on a digital asset security token comprising the steps of: (a) providing a digital asset security token database stored on a first set of one or more computer readable media associated with a digital asset security token issuer system associated with a digital asset security token issuer, wherein the digital asset security token database comprises a log of digital asset security tokens including: (i) a first set of digital asset addresses including a respective digital asset address for each respective digital asset security token holder; and (ii) a respective digital asset security token amount associated with each respective digital asset address, wherein each respective digital asset address of the first set of digital asset addresses is tied to a distributed transaction ledger maintained by a plurality of geographically distributed computer systems in a peer-to-peer network; (b) providing a flat-backed digital asset database stored on the distributed transaction ledger maintained by the plurality of geographically distributed computer systems in the peer-to-peer network, wherein the fiat-backed digital asset database comprises a log of fiat-backed digital assets including: (i) a second set of digital asset addresses including a second respective digital asset address for each respective fiat-backed digital asset holder; (ii) a respective flat-backed digital asset amount for each respective fiat-backed digital asset holder, wherein the fiat-backed digital assets are issued by a fiat-backed digital asset issuer; (c) obtaining, by a trusted entity system associated with a trusted entity, a first sum of fiat-backed digital assets, wherein the first sum of fiat backed digital assets are backed by assets comprising at least a second amount of a first fiat maintained by a custodian; (d) accessing, by the trusted entity system, the digital asset security token database to determine: (i) each respective digital asset address of the first set of digital asset addresses for each respective digital asset security token holder; and (ii) the respective digital asset security token amount associated with each respective digital asset address; (e) determining a respective payment amount in fiat-backed digital assets to be made to each respective digital asset address of the first set of digital asset addresses based at least in part on the fixed notional amount, the first sum of fiat-backed digital assets and the respective digital asset security token amount associated with each respective digital asset address of the first set of digital asset addresses; (f) generating, by the trusted entity system, transaction instructions to transfer the respective payment amount of flat-backed digital assets to each respective digital asset address of the first set of digital asset addresses from the issuer account to the security token holder accounts; (g) publishing, by the trusted entity system to the peer-to-peer network, transaction instructions associated with crediting the respective payment amount of fiat-backed digital assets to each respective digital asset address of the first set of digital asset addresses where ownership of each digital asset security token remains the same; (h) notifying, by the trusted entity system, each digital asset address of the first set of the digital asset addresses of each respective transfer of fiat-backed digital assets to each respective digital asset address of the first set of digital asset addresses.

In embodiments, the peer-to-peer network is the ETHEREUM network.

In embodiments, the peer-to-peer network is the BITCOIN network.

In embodiments, the peer-to-peer network is the LIBRA network.

In embodiments, the peer-to-peer network is the STELLAR network.

In embodiments, the trusted entity is a regulated digital asset exchange.

In embodiments, the digital asset security token is a security registered with a government authority.

In embodiments, the digital asset security token is a debt security and the electronic payments are interest.

In embodiments, the digital asset security token is an equity security and the electronic payments are dividends.

In embodiments, the digital asset security token is secured by intellectual property rights and the electronic payments are royalties.

In embodiments, the peer-to-peer network is based on a mathematical protocol for proof of work. In embodiments, the mathematical protocol is open source. In embodiments, the peer-to-peer network is based on a mathematical protocol for proof of stake. In embodiments, the mathematical protocol is open source.

In embodiments, the peer-to-peer network is based on a cryptographic mathematical protocol.

In embodiments, the method further includes a step of publishing, by the trusted entity system to a side ledger, the transaction instructions associated with crediting the respective payment amount of fiat-backed digital assets to each respective digital asset address of the first set of digital asset addresses and the publishing step (g) includes publishing the transaction instructions from the side ledger to the distributed asset ledger periodically or aperiodically.

In embodiments, the method further includes the steps of: receiving, at the digital asset security token issuer system, from at least one digital asset security token holder, a payment request prior to the obtaining step (c), the payment request including: (i) the digital asset address of the digital asset security token holder; and (ii) a request to transfer a payment amount of fiat-backed digital assets to the digital asset address of the digital asset security token holder; and confirming, at the digital asset security token issuer system, that: (i) the digital asset address of the digital asset security token holder is valid; (ii) the digital asset security token amount of digital asset security tokens associated with the address of the digital asset security token holder is more than zero; and (iii) the digital asset token security holder is entitled to payment.

In embodiments, the digital asset security token database is maintained and stored on the plurality of geographically distributed computer systems in the peer-to-peer network.

In embodiments, the digital asset security token database is maintained on a sidechain, separate from the peer-to-peer network, wherein information on the sidechain is published and stored on the peer-to-peer network periodically or aperiodically.

In embodiments, the generating step (f) includes generating, by the trusted entity system, transaction instructions for the first sum of fiat-backed digital assets by updating the fiat-backed digital asset database to reserve fiat-backed digital assets in the amount of the first sum.

In embodiments, the payment information relates to a dividend to be paid based on ownership of each digital asset security token.

In embodiments, the payment amount relates to a royalty to be paid based on ownership of each digital asset security token.

In embodiments, the payment amount relates to interest to be paid based on ownership of each digital asset security token.

In embodiments, the peer-to-peer network uses a byzantine fault tolerance protocol as a consensus mechanism.

In embodiments, the first sum of fiat-backed digital assets are backed by assets further comprising at least a third amount of a second fiat.

In embodiments, the assets further comprise at least one treasury. In embodiments, the assets further comprise one or more of the following types of fiat: (i) U.S. Dollars; (ii) Yen; and (iii) Euro.

In embodiments, the fiat-backed digital assets are issued by a fiat-backed digital asset issuer through one or more nodes associated with the issuer.

In embodiments, the digital asset address of the digital asset security token holder is generated by applying a hash algorithm to a public key associated with the digital asset security token holder.

In embodiments, the method further includes, after step (e) and before step (f), generating, by the trusted entity system, transaction instructions for the first sum of fiat-backed digital assets by updating the flat-backed digital asset database to reflect the addition of new flat-backed digital assets in the amount of the first sum and the corresponding digital asset addresses associated with each new fiat-backed digital asset.

In embodiments, a method of withdrawing an amount of a fiat-backed digital asset from a digital asset exchange computer system in exchange for fiat, wherein the method comprises the steps of (a) authenticating, by the digital asset exchange computer system associated with a digital asset exchange, an access request by a first user device associated with a first user, to the digital asset exchange computer system comprising the steps of: (1) receiving, by the digital asset exchange computer system from the first user device, an authentication request including first user credential information associated with the first user; (2) determining, by the digital asset exchange computer system, that the first user device is authorized to access the digital asset exchange computer system based at least in part on the first user credential information; (3) generating, by the digital asset exchange computer system, first graphical user interface information for displaying a first graphical user interface on the first user device; and (4) transmitting, from the digital asset exchange computer system to the first user device, the first graphical user interface information; (b) obtaining, by the digital asset exchange computer system from the first user device, a first electronic withdraw request comprising the steps of: (1) receiving, by the digital asset exchange computer system from the first user device, a first electronic request to withdraw the amount of the fiat-backed digital asset, wherein the fiat-backed digital assets are tied to a distributed transaction ledger which is maintained on a peer to peer network that includes a plurality of geographically distributed computer systems; (2) in response to the first electronic withdraw request, obtaining, by the digital asset exchange computer system from a fiat account ledger database stored on a computer readable member accessible by the digital asset exchange computer system, first fiat account balance information of the first user indicating a first amount of available fiat for the first user held by the digital asset exchange on behalf of the first user; (3) generating, by the digital asset exchange computer system, second graphical user interface information including at least the first fiat account balance information; (4) transmitting, by the digital asset exchange computer system to the first user device, the second graphical user interface information; and (5) receiving, by the digital asset exchange computer system from the first user device, a second electronic withdrawal request comprising at least: (A) a first amount of fiat-backed digital asset to be withdrawn; and (B) a destination public address on the distributed transaction ledger to transfer the first amount of fiat-backed digital asset; and (c) processing, by the digital asset exchange computer system, the withdraw request by the steps of: (1) calculating, by the digital asset exchange computer system, a second amount of fiat based on the first amount of fiat-backed digital asset, where the second amount of fiat is determined based on an exchange rate of fiat-backed digital asset to fiat; (2) comparing, by the digital asset exchange computer system, the first amount of available fiat of the first user to the second amount of fiat to determine that the second amount of fiat is less than or equal to the first amount of available fiat of the first user; (3) determining, by the digital asset exchange computer system, a third amount of fiat associated with an updated amount of available fiat of the first user, wherein the third amount of fiat equals the first amount of available fiat of the first user less the second amount of fiat; (4) updating, by the digital asset exchange computer system, the fiat account ledger database to reflect that the third amount of fiat is the updated first amount of available fiat of the first user; (5) updating, by the digital asset exchange computer system, a fiat-backed digital asset issuer fiat ledger, to increase a balance of fiat associated with the fiat-backed digital asset ledger by the second amount of fiat; (6) generating, by the digital asset exchange computer system, a first transaction request for the distributed transaction ledger, from a first digital asset exchange public key address on the distributed transaction ledger, which is associated with a first digital asset exchange private key, which is stored in the computer readable member accessible by the digital asset exchange computer system, to a first contract address associated with a fiat-backed digital asset issuer, a first message including: i. a request to obtain in a first designated public address of the first user the first amount of fiat-backed digital asset, wherein the first transaction request is signed with a digital signature generated using the digital asset exchange private key; (7)transmitting, by the digital asset exchange computer system to the peer-to-peer network via the Internet, the first transaction request; and (8) confirming, by the digital asset exchange computer system based on reference to the distributed transaction ledger, that the balance of fiat-backed digital asset in the first designated public address of the first user includes the first amount of fiat-backed digital asset.

In embodiments, the determining step (a)(2) further determines that the first user is a registered user of the digital asset exchange.

In embodiments, the digital asset exchange is licensed by a government regulatory authority.

In embodiments, the fiat-backed digital asset is a fiat-backed digital asset token. In embodiments, the fiat-backed digital asset token is Gemini Dollars.

In embodiments, the fiat-backed digital asset is a stable value digital asset token.

In embodiments, the fiat-backed digital asset is LIBRA.

In embodiments, the peer-to-peer network uses a proof of stake consensus protocol.

In embodiments, the peer-to-peer network uses a proof of work consensus protocol.

In embodiments, the peer-to-peer network uses a byzantine fault tolerance consensus protocol.

In embodiments, the peer-to-peer network is the ETHEREUM Network.

In embodiments, the peer-to-peer network is the NEO Network.

In embodiments, the peer-to-peer network is the LIBRA Network.

In embodiments, the peer-to-peer network is the STELLAR Network.

In embodiments, the exchange rate is one flat-backed digital asset is equal to one U.S. dollar.

In embodiments, the exchange rate is one hundred fiat-backed digital assets is equal to one U.S. dollar.

In embodiments, the first designated public address of the first user is generated by applying a hash algorithm to a public key associated with the first user.

In embodiments, the fiat-backed digital assets are backed by a plurality of assets comprising at least: (a) a fourth amount of a first type of fiat maintained by a custodian; and (b) a fifth amount of a second type of fiat maintained by the custodian. In embodiments, the fiat-backed digital assets are backed by assets further comprising at least one treasury security. In embodiments, the first type of fiat is one of the following types of fiat: (a) U.S. Dollars; (b) Yen; and (c) Euro. In embodiments, the second type of fiat is one of the following types of fiat: (a) U.S. Dollars; (b) Yen; and (c) Euro. In embodiments, the first type of fiat and the second type of fiat are the same.

In embodiments, the updating step (c)(5) further comprises transferring the second amount of fiat from a digital asset exchange fiat account to a fiat-backed digital asset issuer fiat account.

In embodiments, the updating step (c)(5) further comprises periodically transferring fiat between the digital asset exchange fiat account and the fiat-backed digital asset issuer fiat account.

In embodiments, the request to obtain in the first designated public address of the first user the first amount of fiat-backed digital assets includes a request to generate the first amount of fiat-backed digital assets at the first designated public address of the first user.

In embodiments, the request to obtain the first designated public address of the first user the first amount of fiat-backed digital assets includes a request to transfer the first amount of fiat-backed digital assets from a fiat-backed digital asset issuer public address to the first designated public address of the first user.

In embodiments, the distributed transaction ledger is a public ledger.

In embodiments, the distributed transaction ledger is a private ledger.

In embodiments, the distributed public ledger is a semi-private ledger.

In embodiments, the distributed public ledger comprises contract code.

In embodiments, a method of depositing an amount of fiat-backed digital asset in exchange for fiat, wherein the method comprises the steps of: (a) authenticating, by the digital asset exchange computer system associated with a digital asset exchange, an access request by a first user device associated with a first user, to the digital asset exchange computer system comprising the steps of: (1) receiving, by the digital asset exchange computer system from the first user device, an authentication request including first user credential information associated with the first user; (2) determining, by the digital asset exchange computer system, that the first user device is authorized to access the digital asset exchange computer system based at least in part on the first user credential information; (3) generating, by the digital asset exchange computer system, first graphical user interface information for displaying a first graphical user interface on the first user device; and (4) transmitting, from the digital asset exchange computer system to the first user device, the first graphical user interface information; (b) obtaining, by the digital asset exchange computer system from the first user device, a first electronic deposit request comprising the steps of: (1) receiving, by the digital asset exchange computer system from the first user device, a first electronic request to deposit a first amount of fiat-backed digital assets, wherein the fiat-backed digital assets are tied to a an distributed transaction ledger which is maintained on a peer-to-peer network that includes a plurality of geographically distributed computer systems; (2) in response to the first electronic request, obtaining, by the digital asset exchange computer system from a fiat account ledger database stored on a computer readable member accessible by the digital asset exchange computer system, first fiat account balance information of the first user indicating a first amount of available fiat for the first user held by the digital asset exchange on behalf of the first user and from the distributed transaction ledger, first fiat-backed digital asset account balance information if the first user indicating a second amount of fiat based digital assets available for the first user; (3) obtaining, by the digital asset exchange computer system, a destination address; (4) generating, by the digital asset exchange computer system, second graphical user interface information including at least the first fiat account balance information the first fiat-backed digital account balance information and the destination address; (5) transmitting, by the digital asset exchange computer system to the first user device, the second graphical user interface information; and (6) receiving, by the digital asset exchange computer system from the first user device, a second electronic deposit request comprising at least: (A) the first amount of fiat-backed digital assets to be deposited; (B) a first designated public address of the first user on the distributed transaction ledger from which the first amount of fiat-backed digital assets will be transferred; and (C) a digital signature based on a first designated private key of the first user, wherein the first designated private key is associated with the first designated public address; and (c) processing, by the digital asset exchange computer system, the second electronic deposit request by the steps of: (1) calculating, by the digital asset exchange computer system, a second amount of fiat based on the first amount of flat-backed digital assets, wherein the second amount of fiat is determined using an exchange rate of fiat-backed digital assets to fiat; (2) comparing, by the digital asset exchange computer system, the first amount of fiat-backed digital assets to the second amount of fiat-backed digital assets available of the first user to determine that the first amount of fiat-backed digital assets is less than or equal to the second amount of flat-backed digital assets; (3) determining, by the digital asset exchange computer system, a third amount of fiat associated with an updated amount of available fiat of the first user, wherein the third amount of fiat equals the first amount of fiat available of the first user plus the second amount of fiat; (4) updating, by the digital asset exchange computer system, the fiat account ledger database to reflect that the third amount of fiat is the updated amount of available fiat of the first user; (5) generating, by the digital asset exchange computer system, a first transaction request for the peer-to-peer network, from a first digital asset exchange public key address on the peer-to-peer network, which is associated with a first digital asset exchange private key, which is stored in the computer readable member accessible by the digital asset exchange computer system, to a first contract address associated with a fiat-backed digital asset issuer, a first message including: i. a request to obtain from the first designated public address of the first user the first amount of fiat-backed digital assets and provide them to the destination address; and ii. a request to destroy the first amount of fiat-backed digital assets, wherein the first transaction request is signed with a digital signature generated based on the digital asset exchange private key of the digital asset exchange; (6) updating, by the digital asset exchange computer system, a fiat-backed digital asset issuer fiat ledger, to decrease a balance of fiat by the second amount of fiat; (7) transmitting, by the digital asset exchange computer system to the peer-to-peer network via the Internet, the first transaction request; and (8) confirming, by the digital asset exchange computer system based on reference to the distributed transaction ledger, that the first amount of fiat-backed digital assets are not present at the first designated public address of the first user.

In embodiments, the determining step (a)(2) further determines that the first user is a registered user of the digital asset exchange.

In embodiments, the digital asset exchange is licensed by a government regulatory authority.

In embodiments, the peer-to-peer network is the ETHEREUM Network.

In embodiments, the peer-to-peer network is the NEO Network.

In embodiments, the exchange rate is one fiat-backed digital asset is equal to one U.S. dollar.

In embodiments, the exchange rate is one hundred fiat-backed digital assets is equal to one U.S. dollar.

In embodiments, the updating step (c)(6) further comprises transferring the second amount of fiat from a digital asset exchange fiat account to a first user fiat account.

In embodiments, the updating step (c)(6) further comprises periodically transferring fiat between the digital asset exchange fiat account and the fiat-backed digital asset issuer fiat account.

In embodiments, the fiat-backed digital asset is a fiat-backed digital asset token. In embodiments, wherein the fiat-backed digital asset token is Gemini Dollars.

In embodiments, the fiat-backed digital asset is a stable value digital asset token.

In embodiments, the fiat-backed digital asset is LIBRA.

In embodiments, the peer-to-peer network uses a proof of stake consensus protocol.

In embodiments, the peer-to-peer network uses a proof of work consensus protocol.

In embodiments, the peer-to-peer network uses a byzantine fault tolerance consensus protocol.

In embodiments, the first designated public address of the first user is generated by applying a hash algorithm to a public key associated with the first user.

In embodiments, the fiat-backed digital assets are backed by a plurality asset comprising at least: (a) a fourth amount of a first type of fiat maintained by a custodian; and (b) a fifth amount of a second type of fiat maintained by the custodian. In embodiments, the fiat-backed digital assets are backed by assets further comprising at least one treasury security. In embodiments, the first type of fiat is one of the following types of fiat: (a) U.S. Dollars; (b) Yen; and (c) Euro. In embodiments, the second type of fiat is one of the following types of fiat: (a) U.S. Dollars; (b) Yen; and Euro.

In embodiments, the distributed transaction ledger is a public ledger.

In embodiments, the distributed transaction ledger is a private ledger.

In embodiments, the distributed public ledger is a semi-private ledger.

In embodiments, the distributed public ledger comprises contract code.

In embodiments, a method of depositing an amount of fiat-backed digital asset in exchange for fiat, wherein the method comprises the steps of: (a) authenticating, by the digital asset exchange computer system associated with a digital asset exchange, an access request by a first user device associated with a first user, to the digital asset exchange computer system comprising the steps of: (1) receiving, by the digital asset exchange computer system from the first user device, an authentication request including first user credential information associated with the first user; (2) determining, by the digital asset exchange computer system, that the first user device is authorized to access the digital asset exchange computer system based at least in part on the first user credential information; (3) generating, by the digital asset exchange computer system, first graphical user interface information for displaying a first graphical user interface on the first user device; and (4) transmitting, from the digital asset exchange computer system to the first user device, the first graphical user interface information; (b) obtaining, by the digital asset exchange computer system from the first user device, a first electronic deposit request comprising the steps of: (1) receiving, by the digital asset exchange computer system from the first user device, a first electronic request to deposit a first amount of fiat-backed digital assets, wherein the fiat-backed digital assets are tied to a distributed transaction ledger which is maintained on a peer-to-peer network that includes a plurality of geographically distributed computer systems; (2) in response to the first electronic request, obtaining, by the digital asset exchange computer system from a fiat account ledger database stored on a computer readable member accessible by the digital asset exchange computer system, first fiat account balance information of the first user indicating a first amount of available fiat for the first user held by the digital asset exchange on behalf of the first user and from the distributed transaction ledger, first fiat-backed digital asset account balance information of the first user indicating a second amount of fiat-backed digital assets available for the first user; (3) obtaining, by the digital asset exchange computer system, a destination address; (4) generating, by the digital asset exchange computer system, second graphical user interface information including at least the first fiat account balance information, the first fiat-backed digital asset account information and the destination address; (5) transmitting, by the digital asset exchange computer system to the first user device, the second graphical user interface information; and (6) receiving, by the digital asset exchange computer system from the first user device, a second electronic deposit request comprising at least: (A) the first amount of fiat-backed digital assets to be deposited; and (B) a first designated public address of the first user on the distributed transaction ledger from which the first amount of fiat-backed digital assets will be transferred; and (C) a digital signature based on a first designated private key of the first user, wherein the first designated private key is associated with the first designated public address; and (c) processing, by the digital asset exchange computer system, the second electronic deposit request by the steps of: (1) calculating, by the digital asset exchange computer system, a second amount of fiat based on the first amount of fiat-backed digital assets, wherein the second amount of fiat is determined using an exchange rate of fiat-backed digital assets to fiat; (2) comparing, by the digital asset exchange computer system, the first amount of fiat-backed digital assets to the second amount of fiat-backed digital assets available of the first user to determine that the first amount of fiat-backed digital assets is less than or equal to the second amount of fiat-backed digital assets; (3) determining, by the digital asset exchange computer system, a third amount of flat associated with an updated amount of available fiat of the first user, wherein the third amount of fiat equals the first amount of available fiat of the first user plus the second amount of fiat; (4) updating, by the digital asset exchange computer system, the fiat account ledger database to reflect that the third amount of fiat is the updated amount of available fiat of the first user; (5) generating, by the digital asset exchange computer system, a first transaction request for the peer-to-peer network, from a first digital asset exchange public key address on the peer-to-peer network, which is associated with a first digital asset exchange private key, which is stored in the computer readable member accessible by the digital asset exchange computer system, to a first contract address associated with a fiat-backed digital asset issuer, a first message including: i. a request to obtain from the first designated public address of the first user the first amount of fiat-backed digital assets and provide them to the user specific destination address; and ii. a request to store the first amount of fiat-backed digital assets at the destination address, wherein the first transaction request is signed with a digital signature generated based on the digital asset exchange private key of the digital asset exchange; (6) transmitting, by the digital asset exchange computer system to the peer-to-peer network, via the Internet, the first transaction request; and (7) confirming, by the digital asset exchange computer system based on reference to the distributed transaction ledger, that the first amount of fiat-backed digital assets are not present at the first designated public address of the first user.

In embodiments, the determining step (a)(2) further determines that the first user is a registered user of the digital asset exchange.

In embodiments, the digital asset exchange is licensed by a government regulatory authority.

In embodiments, the peer-to-peer network is the ETHEREUM Network.

In embodiments, the peer-to-peer network is the NEO Network.

In embodiments, the peer-to-peer network is the STELLAR Network.

In embodiments, the peer-to-peer network is the LIBRA Network.

In embodiments, the exchange rate is one fiat-backed digital asset is equal to one U.S. dollar.

In embodiments, exchange rate is one hundred fiat-backed digital assets is equal to one U.S. dollar.

In embodiments, the first designated public address of the first user is generated by applying a hash algorithm to a public key associated with the first user.

In embodiments, the fiat-backed digital assets are backed by a plurality of assets comprising at least: (a) a fourth amount of a first type of fiat maintained by a custodian; and (b) a fifth amount of a second type of fiat maintained by the custodian. In embodiments, the fiat-backed digital assets are backed by assets further comprising at least one treasury security. In embodiments, the first type of fiat is one of the following types of fiat: (a) U.S. Dollars; (b) Yen; and (c) Euro. In embodiments, the second type of fiat is one of the following types of fiat: (a) U.S. Dollars; (b) Yen; and (c) Euro. In embodiments, the first type of fiat and the second type of flat are the same.

In embodiments, the distributed transaction ledger is a public ledger.

In embodiments, the distributed transaction ledger is a private ledger.

In embodiments, the distributed public ledger is a semi-private ledger.

In embodiments, the distributed public ledger comprises contract code.

FIG. 115, a method may comprise the steps of (S5002) providing, by a digital math-based asset computer system comprising one or more computers, one or more exchange account databases stored on non-transitory computer-readable memory and comprising for a plurality of exchange accounts fiat account information for an associated insured fiat account associated with an exchange; digital math-based asset account information for an associated digital math-based asset account associated with the exchange; and user authentication data (e.g., a username and password, multi-factor authentication data, to name a few); and further comprising for a subset of exchange accounts institutional account information associating each of one or more exchange institutional accounts with one or more institutional user access accounts each having respective user authentication data; (S5004) providing, by the digital math-based asset computer system, an orders database stored on the non-transitory computer-readable memory comprising at least digital math-based asset purchase order information comprising purchase order digital math-based asset quantities and corresponding purchase order fiat amounts; and digital math-based asset sell order information comprising sell order digital math-based asset quantities and corresponding sell order fiat amounts; (S5006) providing, by the digital math-based asset computer system, an electronic ledger comprising, for each of the plurality of exchange accounts, fiat account balance data and digital math-based asset account balance data; (S5008) receiving, at the digital math-based asset computer system from a first user electronic device associated with a first user access account associated with an institutional exchange account, a first electronic digital math-based asset purchase order comprising first purchase order information comprising a purchase order digital math-based asset quantity and a corresponding purchase order fiat amount; (S5010) verifying, by the digital math-based asset computer system, that first fiat account balance data indicating a first fiat account balance of a purchaser insured fiat account associated with the institutional exchange account at least equals the purchase order fiat amount; (S5012) storing, by the digital math-based asset computer system in the orders database, the first purchase order information; (S5014) receiving, at the digital math-based asset computer system, from a second user electronic device associated with a second exchange account, a first electronic digital math-based asset sell order comprising first sell order information comprising a sell order digital math-based asset quantity and a corresponding sell order fiat amount; (S5016) verifying, by the digital math-based asset computer system, that first digital math-based asset account balance data indicating a first digital math-based asset account balance of a seller digital math-based asset account associated with the second exchange account at least equals the sell order quantity; (S5018) storing, by the digital math-based asset computer system in the orders database, the first sell order information; (S5020) matching, by the digital math-based asset computer system, the first electronic digital math-based asset purchase order with the first electronic digital math-based asset sell order; (S5022) generating, by the digital math-based asset computer system, machine-readable transaction instructions for an exchange transaction having a transaction digital math-based asset quantity satisfying the first electronic digital math-based asset purchase order and the first electronic digital math-based asset sell order; and a transaction fiat amount satisfying the first electronic digital math-based asset purchase order and the first electronic digital math-based asset sell order; (S5024) executing, by the digital math-based asset computer system, the machine-readable transaction instructions by updating the electronic ledger by decreasing, by the transaction fiat amount, the first fiat account balance data corresponding to the purchaser insured fiat account; increasing, by the transaction fiat amount, second fiat account balance data corresponding to a seller insured fiat account associated with the second exchange account; decreasing, by the transaction digital math-based asset quantity, the first digital math-based asset account balance data corresponding to the seller digital math-based asset account; and increasing, by the transaction digital math-based asset quantity, second digital math-based asset account balance data corresponding to a purchaser digital math-based asset account associated with the institutional exchange account; and (optionally) generating and/or transmitting an electronic transaction confirmation (S5026).

In embodiments, an insured omnibus fiat account may comprise a plurality of the associated insured fiat accounts. In embodiments, at least one insured fiat account may be insured by the Federal Deposit Insurance Corporation. In embodiments, a digital wallet may hold digital math-based assets corresponding to a plurality of the digital math-based asset accounts.

In embodiments, the method may further comprise the step of transmitting, from the digital math-based asset computer system, an electronic transaction confirmation. In embodiments, an electronic transaction confirmation may be transmitted to the first user electronic device. In further embodiments, an electronic transaction confirmation may be transmitted to the second user electronic device. In still further embodiments, an electronic transaction confirmation may be transmitted to the second user electronic device to a computer system associated with an institution associated with the exchange institutional account.

In embodiments, the security systems and methods described herein may be used, e.g., as security protocols, associated with various financial products, such as a derivative product, an exchange traded derivative product, a fund, a company, an exchange traded fund, a note, an exchange traded note, a security, a debt instrument, a convertible security, an instrument comprising a basket of assets including one or more digital math-based assets, and/or an over-the-counter product.

In embodiments, an apparatus may be programmed to perform the following steps: receiving, at the apparatus via a user input device, first user identification data comprising at least a state of domicile; transmitting, from the apparatus to an exchange computer system, the first user identification data; receiving, at the apparatus from the exchange computer system, first display data related to an anti-money laundering user data collection interface based upon the state of domicile; rendering, by the apparatus on a display device operatively connected to the apparatus, the first display data; receiving, at the apparatus via the user input device, second user identification data corresponding to the anti-money laundering user data collection interface; transmitting, from the apparatus to the exchange computer system, the second user identification data; receiving, at the apparatus from the exchange computer system, second display data related to a registration confirmation; and rendering, by the apparatus on the display device, the second display data.

In embodiments, such an apparatus may be an electronic kiosk. In embodiments, such an apparatus may be a user device, such as a smart phone, tablet computer, and/or computer.

In embodiments, the apparatus may be further programmed to perform the steps of receiving, at the apparatus from the exchange computer system, third display data related to exchange transaction options; rendering, by the apparatus on the display device, the third display data; receiving, at the apparatus via a user input device, a selection of an exchange transaction option related to a flat withdrawal and a corresponding transaction request comprising at least a fiat withdrawal amount; and transmitting, from the apparatus to the exchange computer system, the transaction request.

In embodiments, an apparatus programmed to perform the following steps: receiving, at the apparatus via an input device, user account credentials; transmitting, from the apparatus to the exchange computer system, the user account credentials; receiving, at the apparatus from the exchange computer system, first display data corresponding to a plurality of exchange transaction options for an authenticated user; rendering, by the apparatus, the first display data on a display device operatively connected to the apparatus; receiving, at the apparatus via the input device, user selections corresponding to a first exchange transaction option that is an exchange transaction order; receiving, at the apparatus via the input device, exchange transaction order parameters; transmitting, from the apparatus to the exchange computer system, the exchange transaction order parameters; receiving, at the apparatus from the exchange computer system, second display data corresponding to order placement confirmation; and rendering, by the apparatus, the second display data on the display device.

A technical challenge of many digital asset exchanges is how to allow authorized users to exchange large blocks of digital assets without causing unwelcome price movements due to the pending transaction. For example, if a large order (e.g., bid or ask) for a large number of digital asset units (e.g., 10 BTC, which at a USD$10,000 per BTC price could be USD$100,000, or 100BTC, to name a few) is identified on a public order book, the public posting of such an offer may cause the price of the digital asset to spike or drop disproportionate to the spot price that might otherwise be available in the market if it was not on the public order book.

In embodiments, the digital asset exchange computer system may include block trading options, which can overcome these technical problems. By way of illustration, a separate block trading order book can be set up for a specific digital asset class or pair (e.g., BTC-USD) in which only certain designated users may participate. For example, the separate block trading order book may only be available for customers who have a sufficient quantity of digital assets to meet minimum block requirement such as those discussed below, such as institutional customers, such that they can buy or sell in large volume transactions, as a block taker, and a plurality of qualified market makers who are qualified to act as a counter party, maker(s), responding to a proposed request or indication of interest with a response. In embodiments, a separate block trading order book for each taker request may be maintained separately from other order books, such as a continuous trading order book, an auction trading order book, or other block trading order books, to name a few.

Figure 57:
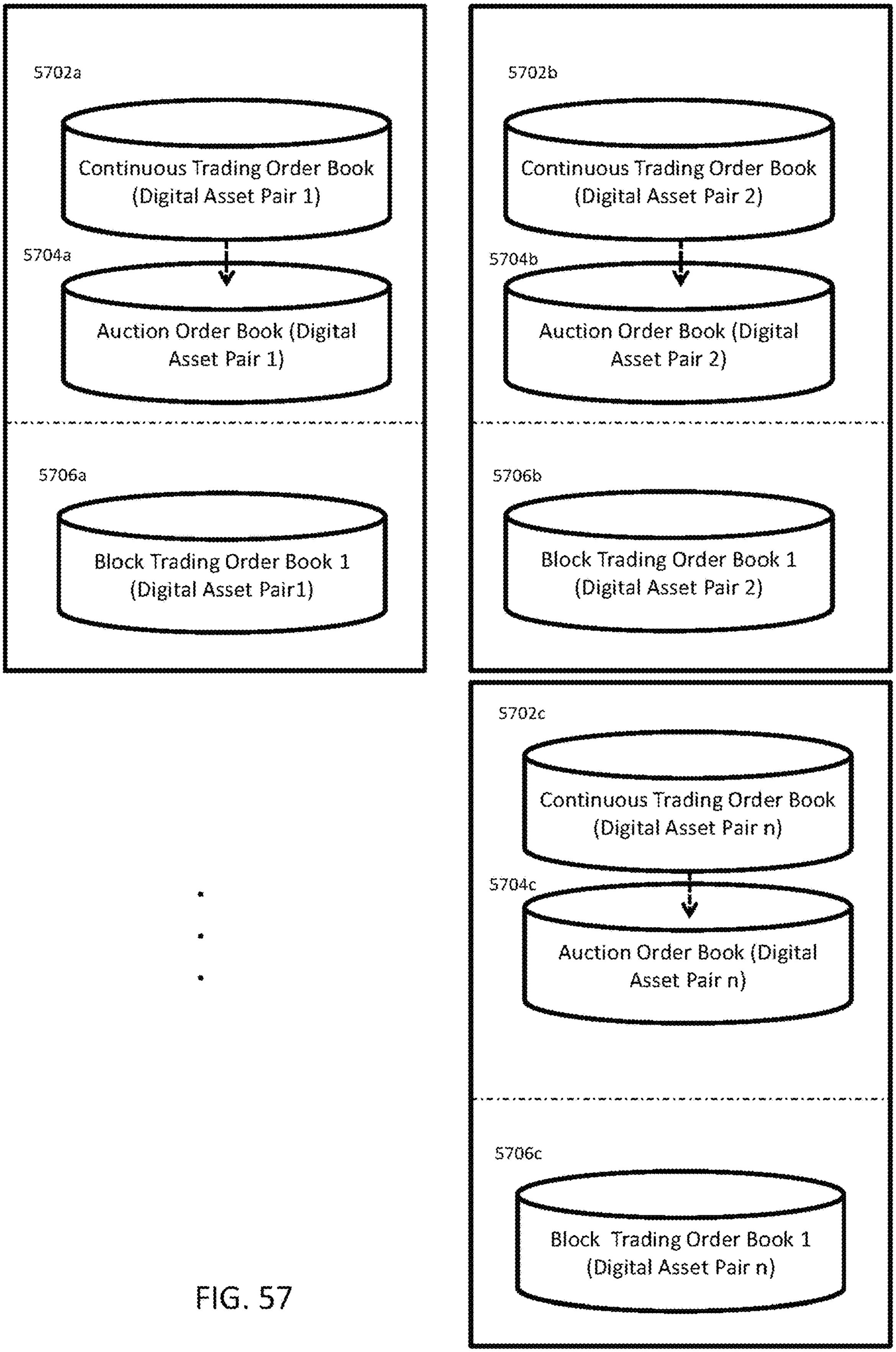
FIG. 57 is an exemplary database structure for order book databases on a digital asset exchange in accordance with exemplary embodiments of the present invention.

FIG. 57 illustrates exemplary database structures in accordance with exemplary embodiments. A method for conducting a block trade order of a digital asset (e.g., BTC) on a digital asset exchange computer system is disclosed. In general, order books are maintained based on pairs, such as a digital asset to fiat pairing (e.g., BTC-USD) or digital asset to digital asset pairing (e.g., BTC-ETH). In embodiments, order books associated with each pairing may be maintained separately, as illustrated in FIG. 57. In embodiments, order books for a given pairing may include a continuous trading order book (see 5702*a*, 5702*b*, 5702*c*, for example), auction order books (see 5704*a*, 5704*b*, 5704*c*, for example) and/or block trading order books (see 5706*a*, 5706*b*, 5706*c* for example), to name a few. In embodiments, each auction will be maintained in a separate auction order book. As discussed elsewhere herein, in embodiments, a continuous trading order book may be used to fill an auction order, but does not necessarily have to be used. In embodiments, each block trading order request by a taker will be maintained in its own block trading order book. In embodiments, each block trading order book is also segregated and maintained separately from the continuous trading order book and/or the auction order books as is indicated in FIG. 57. In such embodiments, block trading orders may not be filled by crossing orders with continuous trading order books and/or auction order books. In embodiments, block trading orders may not be filled by crossing orders between block trading order books generated based on different block order requests. In embodiments, block trading order books may be suspended during a defined period (e.g., 25 minutes) based on the timing of an auction in the same pairing.

By way of illustration, a block trading order book for a pairing including a digital asset may be set up in which blocks of a designated digital asset size and/or fiat value may be traded. In embodiments, a minimum block size may be established for participation in a block order book. By way of example, for BITCOIN, a minimum block size may include amounts such as 5 BTC, 10 BTC, 15 BTC, 20 BTC, 50 BTC, 100 BTC, to name a few. In embodiments, the minimum block size may be specified based on notional value associated with a respective fiat. For example, in a digital asset to fiat block order trading book, such as BITCOIN to USD (BTC-USD), when the notional value of BTC to USD is set at 1 BTC=USD$10,000, a block size of USD$100,000 may be set or 10 BTC. By further example, if the notional value of BTC to USD is set at 1 BTC=USD$20,000, a block size of USD$100,000 may be set at 5 BTC. In embodiments, the block size may be pegged exactly to a notional fiat value, e.g., $100,000. In embodiments, the block size may be pegged to the nearest significant digit of a digital asset value. For example, in the above example, if the notional value of BTC to USD is set at 1 BTC=USD$11,535, the block size may be set at 10 BTC, instead of 8.66926 BTC. In embodiments, under the same example, the block size could be set at 8.7 BTC, choosing the first decimal place as the relevant significant digit. In embodiments, the block sizes could be modified to reflect changing market conditions. In embodiments, block sizes may also be designated in different amounts and/or different digital assets (e.g., ETHER, LITECOIN, BITCOIN CASH, to name a few) consistent with exemplary embodiments. In embodiments, block trading order books may be set up using digital asset to fiat pairings (e.g., BTC-USD) and/or digital asset to digital asset pairings (e.g., BTC-ETH).

In embodiments, block sizes may be set up in multiples of minimum block sizes. For example, if the minimum block size is set at 10 BTC, then blocks sizes could be set up as 10 BTC, 20 BTC, 30 BTC, etc. to name a few. In embodiments, block sizes may be set up in values that are at fixed intervals, but not necessarily at multiples of minimum block sizes. For example, if the minimum block size is set at 10 BTC, then block sizes could be set up at 5 BTC intervals, starting with the minimum block size, e.g., 10 BTC, 15 BTC, 20 BTC, 25 BTC, 30 BTC, etc., to name a few. In embodiments, block sizes may be set up in values that are not in fixed intervals, such as, by way of example, any block sizes that are above a minimum block size, e.g., any order of over 10 BTC, such as 10.2 BTC or 11 BTC, or 28 BTC to name a few. Other examples of block sizes may be implemented consistent with exemplary embodiments.

Figure 58:
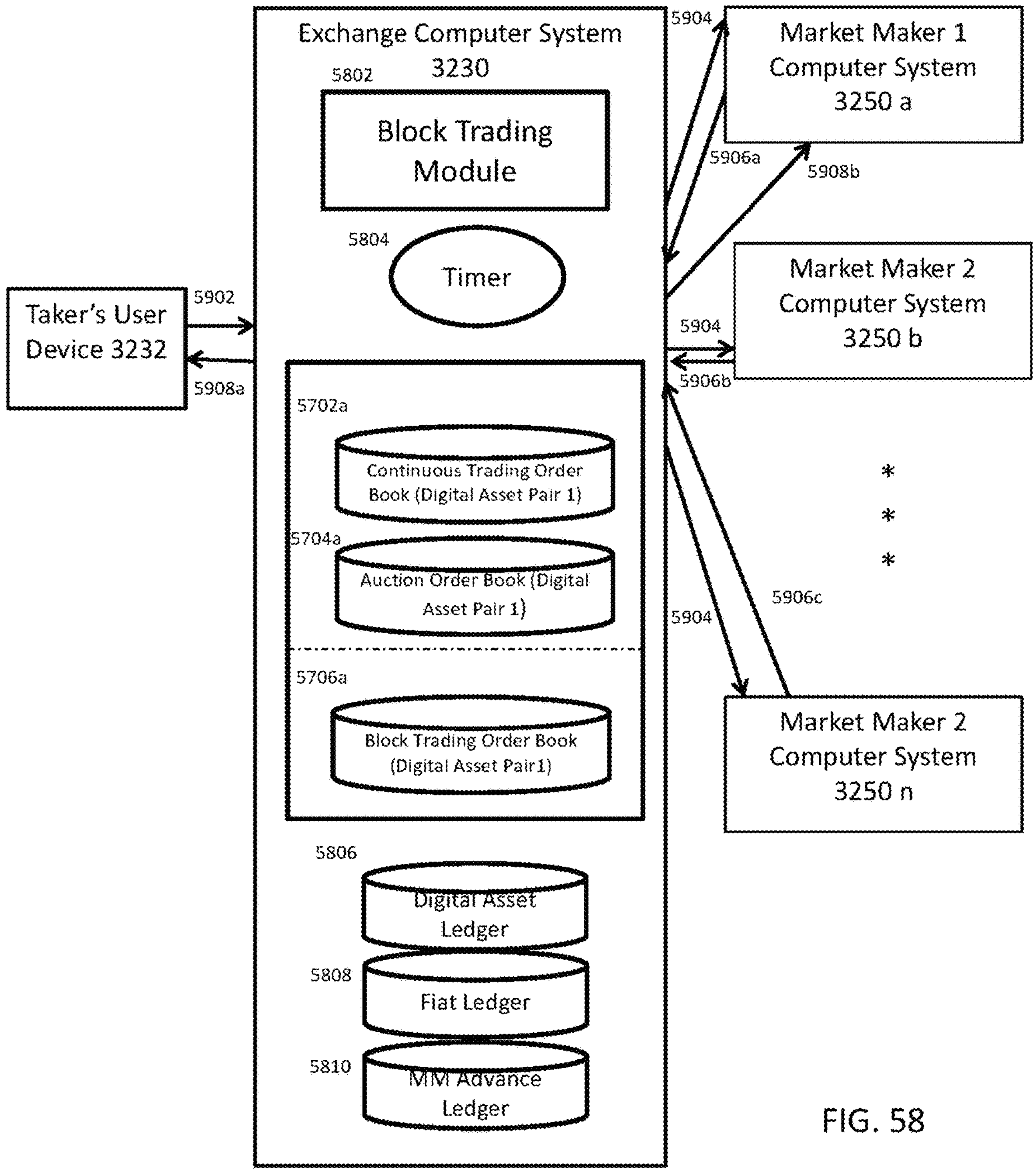
FIG. 58 is a schematic diagram of exemplary structures of a digital asset exchange system for performing block trades in accordance with exemplary embodiments of the present invention.

With reference to FIG. 58, in embodiments, a block trading system may include a taker's user device 3232 which is in communication with the digital asset exchange computer system 3230. The digital asset exchange computer system 3230 preferably includes a block trading module 5802 including computer executable code for performing block trades as described herein. In embodiments, the digital asset exchange computer system 3230 may also include at least one timer 5804, which can be used to calculate one or more time-out periods associated with at least block trading periods. In embodiments, the digital asset exchange computer system 3230 may include one or more databases stored on non-volatile computer readable memory. In exemplary embodiments, such databases may include for a first digital asset pairing, at least a continuous trading order book 5702*a*, auction order book 5704*a* and block trading order book 5706*a*, to name a few. The first digital asset pair may be a pairing of a digital asset with a fiat (e.g., BTC-USD) or a digital asset with another digital asset (e.g., BTC-ETH), to name a few. In embodiments, a continuous trading order book 5702*a* for the first digital asset pair is generally maintained on an on-going basis, except for periods which are designated as black-out periods. In embodiments, for each auction period for the first digital asset pair, an auction order book 5704*a* may also be provided. In embodiments, a separate and segregated block trading order book 5706*a* is maintained. In embodiments, a new segregated block trading order book may be provided for each digital asset pair each time a block order related to the digital asset pair is placed such that each block trading order book relates to a single block order. Thus, for a first block trade order request by a taker, a first block trading order book 5706*a* is maintained, and for a second block trade order request by the same or another taker, a second block trading order book 5706*a'* is maintained, to name a few.

In embodiments, the digital asset exchange computer system 3230 also includes or at least is operationally connected to a digital asset ledger 5806 for each digital asset, a fiat asset ledger 5808 for each fiat. In embodiments, a digital asset ledger 5806 will maintain a list of the beneficial ownership of all the digital assets held by the digital asset exchange. In embodiments, each separate digital asset (e.g., BTC, ETH, etc.) may be maintained in a separate digital asset ledger 5806, or in an aggregated digital asset ledger. In embodiments, a fiat asset ledger 5808 will maintain a list of the beneficial ownership of all the fiat held by the digital asset exchange. In embodiments, each separate fiat (e.g., USD, euro, yet, etc.) may be maintained in a separate fiat ledger 5806, or in an aggregated fiat ledger. In embodiments, where the digital asset exchange allows market makers to obtain operational advances, a market maker advance ledger 5810 may be maintained. In embodiments, the market maker advance ledger 5810 will maintain a list of market makers, advance limits, amounts advanced and/or available advance amounts.

In embodiments, the digital asset exchange computer system 3230 may communicate with a plurality of n market maker computer systems including at least Market Maker 1 Computer System 3250*a*, Market Maker 2 Computer System 3250*b* and Market Maker n Computer System 3250*n*. In embodiments, the digital asset exchange computer system 3230 may communicate with one or more market maker computer systems 3250 using an advanced programming interface (API), such as the kind used in an automated trading system. In general, an API is a set of routines or subroutines, protocols and tools for building software applications, which facilitate communications between various software components. An API may be for a web-based system, operating system, database system, computer hardware or software library. An API specification can take many forms, but often includes specifications for routines, data structures, object classes, variables or remote calls. POSIX, Windows API and ASPI are examples of different forms of APIs. Documentation for the API is usually provided to facilitate usage. An example of such an order placing API is available with the Gemini Exchange, as discussed at docs.gemini.com/rest-api/#new-order.

Figure 56:
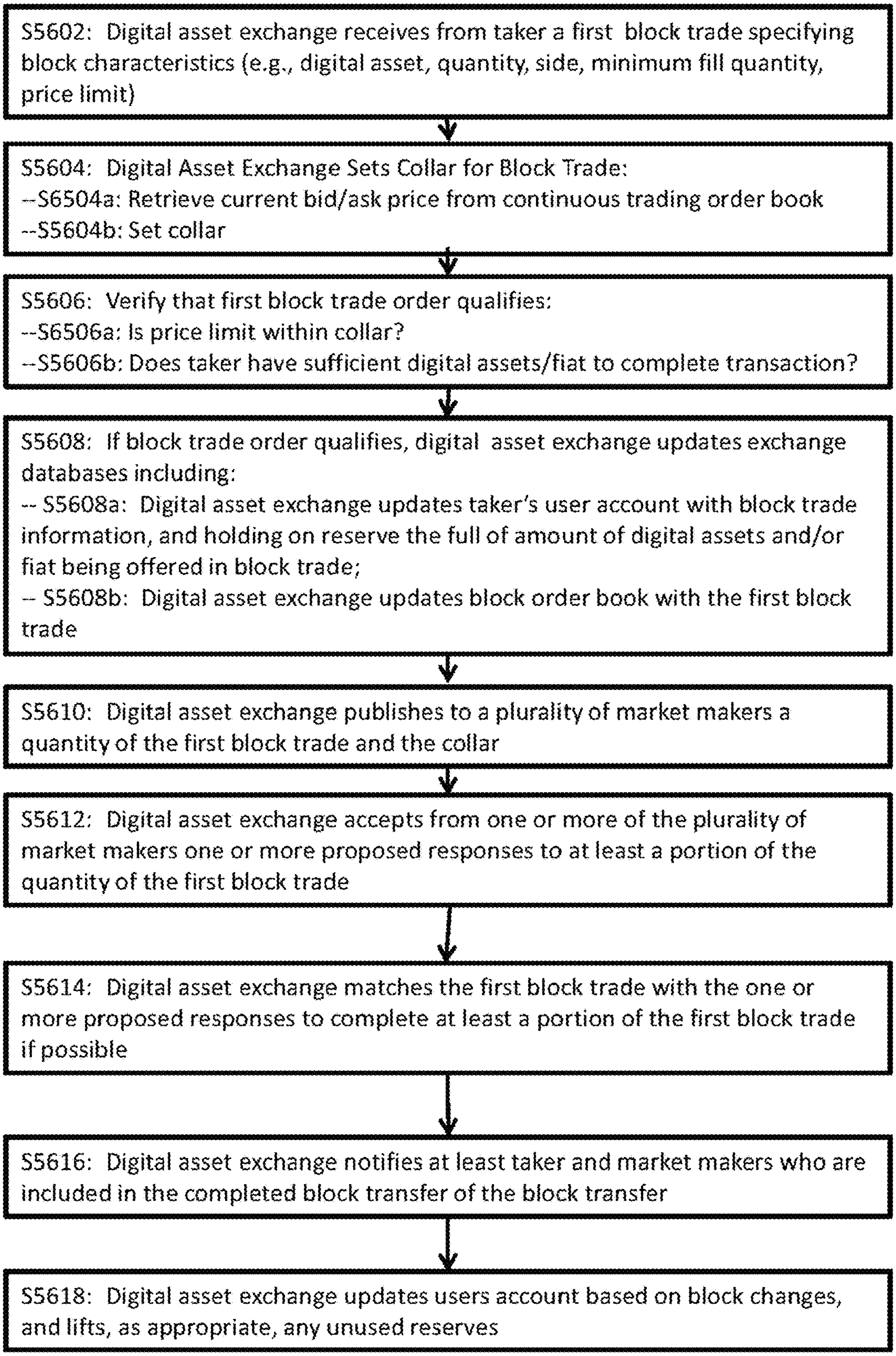
FIGS. 56 and 56A are exemplary flow charts for a block trade process in accordance with exemplary embodiments of the present invention.

Referring to FIG. 56, an exemplary flow chart for a block trading process in accordance with exemplary embodiments of the present system is illustrated.

Figure 59:
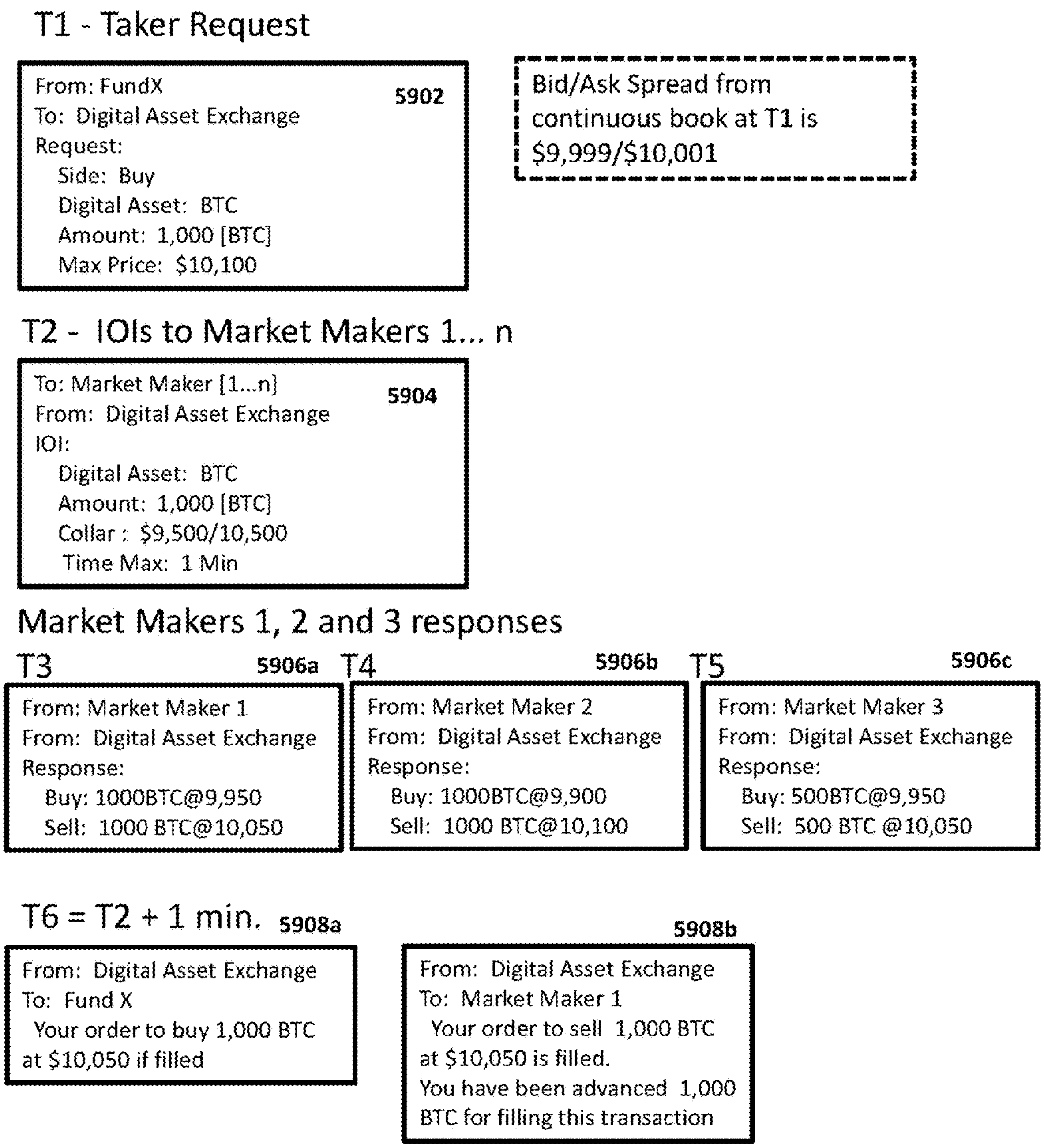

In step S5602, digital asset exchange computer system 3230 receives from a taker user device 3232 associated with a taker (customer), a first block trade order associated with a first pair of a first digital asset and either a first fiat or a second digital asset. The first block trade order specifies block characteristics (e.g., digital asset type, quantity of the digital asset, side of the transaction, minimum fill quantity/price limit). An exemplary block order 5902 is illustrated in FIG. 59. In embodiments, the first block trade order may be submitted in the form of a request via a dashboard display, email, an order placing API or other electronic submission, to name a few.

In step S5604, digital asset exchange computer system 3230 may set a collar for the block trade, including a collar minimum and a collar maximum. First, the digital asset exchange computer system 3230 may access, from at least a first database stored on a computer readable medium operatively connected to the digital asset computer system, pricing data associated with the first digital asset pair at a predefined time associated with a time of the first block trade order. In embodiments, pricing data can include a spot price. In embodiments, pricing data may be based on the last transaction immediately prior to the block trade. In embodiments, pricing data may be based on an average of the most recent bid/ask price for the digital asset. In embodiments, the pricing data may be set based on a blended digital asset price as discussed elsewhere herein. For example, a single exchange digital asset price could be determined based on a volume weighted average and/or time weighted average of recent digital asset pricing. In embodiments, a blended digital asset price may be based on pricing from digital assets taken from a plurality of exchanges (such as qualified exchanges). In embodiments, pricing data may be a blended digital asset price comprising a plurality of digital asset exchanges (e.g., 4) executing trade data for a fixed period of time (e.g., a 10 minute period) using a volume weighting with a fixed percentage (e.g., 5%) of the highest priced trades and a second fixed percentage (e.g., 5%) of the lowest priced trades removed. The digital asset exchange computer system 3230 may calculate a collar minimum for the first block trade order based on the pricing data less an amount equal to a first percentage of the pricing data, and a collar maximum for the first block trade order based on the pricing data plus an amount equal to the first percentage of the pricing data. Thus, a collar may be based on a spot price at the time for the first block trade order, plus or minus a defined range, such as a percentage of the spot price or other pricing data. In embodiments, the collar could be set using percentages such as 1%, 2%, 3%, 5%, 10% of the spot price or other pricing data, to name a few. By way of illustration, if a 5% collar is used with a spot price of 1 BTC=USD$10,000, the collar would be set at between USD$9,500 and USD$10,500.

Accordingly, in embodiments, in sub step S5604*a*, the digital asset exchange computer system 3230 may retrieve a current pricing information (e.g., bid/ask price) from continuous trading order book 5702*a* associated with a first digital asset pairing and establish a spot price for the first digital asset pairing. As noted above, in embodiments, the spot price may be the average of the current bid/ask price or may be the price used in the last transaction in the continuous trading book, to name a few. In embodiments, the spot price may be a blended digital asset price, in which one or more different order books from one or more digital asset exchanges or index databases may be required to be accessed to obtain such price. In embodiments, the blended digital asset price may be obtained by being calculated and/or by accessing a blended digital asset price database (not shown). In sub step S5604*b*, the digital asset exchange computer system may establish the collar, for example, based on adding and/subtracting a fixed percentage of the spot price to the spot price as discussed above, for example.

At step S5606, the digital asset exchange computer system 3230 may verify that the first block trade order qualifies as a legitimate transaction. In embodiments, at sub step S5606*a*, the digital asset exchange computer system 3230 may determine whether the price in the block trade order is within the limits of the collar determined in step S5604*b* (e.g., at or above the collar minimum and at or below the collar maximum). At step S606*b*, the digital asset exchange computer system 3230 may determine whether the taker has sufficient digital assets and/or fiat to complete the transaction based on information provided in the digital asset ledger 5806 and/or fiat ledger 5808. In embodiments, takers are always required to maintain full-reserve for block trading.

In embodiments, in step S5606, the digital asset exchange computer system 3230 may verify the block characteristics of the first block trade order to confirm that the block characteristics are valid block characteristics. In the case where the side of the transaction is buy, the digital asset exchange computer system 3230 may verify the taker has sufficient amounts of the first fiat or second digital asset as appropriate, to cover the first block trade order if filled in full. In the case where the side of the transaction is sell, the digital asset exchange computer system 3230 may verify the taker has sufficient amounts of the first digital asset to cover the first block trade order if filled in full.

Assuming that the first block trade order qualifies, in step S5608, the digital asset exchange computer system 3230 updates exchange databases, including e.g., a block trading order book 5706*a*, 5706*b*, 5706*c* associated with the digital asset of the order, a digital asset ledger 5806, and/or a fiat ledger 5808 of the taker, as appropriate. In embodiments, the updating process may include sub step S5608*a* in which the digital asset exchange computer system 3230 updates taker's user account in the digital asset ledger 5806 and/or the fiat ledger 5808 as appropriate with block trade order information, and places holds on reserve the full of amount of digital assets and/or fiat being offered in the block trade. As noted above, in embodiments, block trading may require a full reserve on the taker side. In embodiments, the updating process may include sub step S5608*b* in which the digital asset exchange computer system 3230 updates the block trading order book 5706*a*, 5706*b*, 5706*c* with the first block trade.

Thus, in embodiments, upon successful verification of the first block trade order in step S5608, the digital asset exchange computer system 3230 may update a user account associated with the taker to set aside sufficient reserves in the first digital asset, the first fiat and/or the second digital asset sufficient to cover the first block trade order if filled in full. Thereafter, the digital asset exchange computer system 3230 may store on one or more computer readable mediums, a first block order trading book including the first block trade.

In step S5610, the digital asset exchange computer system 3230 publishes to a plurality of n market maker computer systems 3250*a*, 3250*b*, . . . 3250*n*, a quantity and digital asset of the first block trade. An example of a publication of such an indication of interest (IOI) 5904 is shown in FIG. 59.

It is noted that the market makers are not informed the side of the transaction in which the taker is participating, i.e., as to whether the block trade order is an offer to buy or an offer to sell. Similarly, the market makers are not informed of other information regarding the block trade, such as identification information regarding the taker.

In embodiments, in step S5610, the digital asset exchange computer system 3230 may generate a first indication of interest associated with the first block trade including: (i) the first digital asset as digital asset type; (ii) the digital asset quantity of the first digital asset; (iii) the collar minimum; and (iv) the collar maximum. Thereafter, the digital asset exchange computer system 3230 may publish the first indication of interest to a first plurality of market maker computer systems 3250*a*, 3250*b* . . . 3250*n*, wherein each market maker computer system is associated with a respective market maker.

In step S5612, the digital asset exchange computer system 3230 receives from one or more of the plurality of market maker computer systems 3250*a*, 3250*b* . . . 3250*n* associated with respective market makers, one or more responses relating to at least a portion of the quantity of the first block trade. If no responses are received within a pre-set time period, the block trade order will fail. In FIG. 59, representative response 5906*a* from Market Maker 1, representative response 5906*b* from Market Maker 2 and representative response 5906*c* from Market Maker 3 are illustrated. In embodiments, market maker responses must include both proposed buy and sell prices that are within the collar to be considered and placed in the block trading order book.

In embodiments, a limited time window (e.g., 1 minute, 5 minutes, 10 minutes, to name a few) may be set in which the digital asset exchange computer system 3230 may accept responses to the indication of interest. In such embodiments, the timer 5804 may be set at the time step S5610 is executed to determine a time-out period. At the end of the limited time window (e.g., when the time-out period expires), the digital asset exchange computer system 3230 will stop accepting responses from market maker computer systems and close the block trading window.

In embodiments, market makers may not be required to maintain full-reserve and may be granted operational advances. Operational advance limits are preferably fixed, and generally made on a customer-by-customer basis and can be adjusted from time to time. In embodiments, other operational advance limits may be set. As discussed above, in embodiments, an operational advance ledger 5810 may be maintained by the digital asset exchange computer system 3230 to track, for each market maker, available operational advances.

In embodiments, the digital asset exchange computer system 3230 may verify the validity of each response by each market maker received during the available time period, and only validated responses may be considered. In embodiments, a response which offers a bid that is outside the collar may be rejected. In embodiments, a response which offers an amount outside of the authorized amount for the respective market maker may also be rejected. In embodiments, a response which is not for a least an acceptable minimum amount may also be rejected. In embodiments, a response for an amount of digital assets greater than the indication of interest may also be rejected, and/or applied as if it were for the amount of digital assets included in the indication of interest. In embodiments, other validation criteria may also be applied.

Thus, during a first time period after step S5610, the digital asset exchange computer system 3230 may receive from one or more market maker computer systems of the first plurality of market maker computer systems 3250*a*, 3250*b* . . . 3250*n*, one or more first responses to the first indication of interest. In embodiments, for each response received, the digital asset exchange computer system 3230 further verifies that the respective response is a valid response, coming within the parameters of the first indication of interest. In embodiments, upon verification of the respective response, the digital asset exchange computer system 3230 may update the first block trading order book to including the respective response.

In embodiments, each market maker may be limited to a single response to each indication of interest. In embodiments, each market maker may be authorized to submit more than one response for each indication of interest.

In step S5614, after the block trading window is closed, the digital asset exchange computer system 3230 crosses the first block trade order with the one or more validated responses to complete at least a portion of the first block trade, if possible. In embodiments, only complete block trades may be filled. In embodiments, partial block trades may be filled. In embodiments, matching is accomplished via a set of predetermined matching rules. In embodiments, price is given preference over all other parameters in the market maker responses such that where the block trade order is a "sell" side transaction by the taker, matching will give preference to those responses including a maximum "buy" price. Conversely, in embodiments, where the block trade order is a "buy" side transaction by the taker, matching will give preference to those responses including a minimum "sell" price. Generally, in embodiments, where two or more market makers propose the same matching price, preference may be given to the response received by the digital asset exchange computer system 3230 first. In embodiments, each matching trade will be applied in the designated priority order (e.g., price-time priority) until the order is filled, or the matching responses are exhausted.

In embodiments, upon closing of the block trading window, the digital asset exchange computer system 3230 may identify one or more matching market maker responses associated with respective market makers, by crossing the first block trade order with each of the respective responses in the first order book, to identify based on price-time priority, each of the matching responses to the first block trade order until the earliest of: (i) the first block trade order being filled by matching responses; (ii) no more matching responses are present while less than all of the first block trade order is filled; or (iii) there are no matching responses before the block trading window closes in which case the block trade fails.

In step S5616, the digital asset exchange computer system 3230 notifies at least the taker computer system 3232 and market maker computer systems 3250*a*, 3250*b* . . . 3250*n* associated with market maker(s) who are included in the completed block transfer of the block transfer. In embodiments, neither the taker nor the market makers are informed of the identity of any other party (or parties) to the completed block trade. In embodiments, once the digital asset exchange computer system completes the matching in step S5614, no further action is required by either party to the transaction.

Figure 56A:
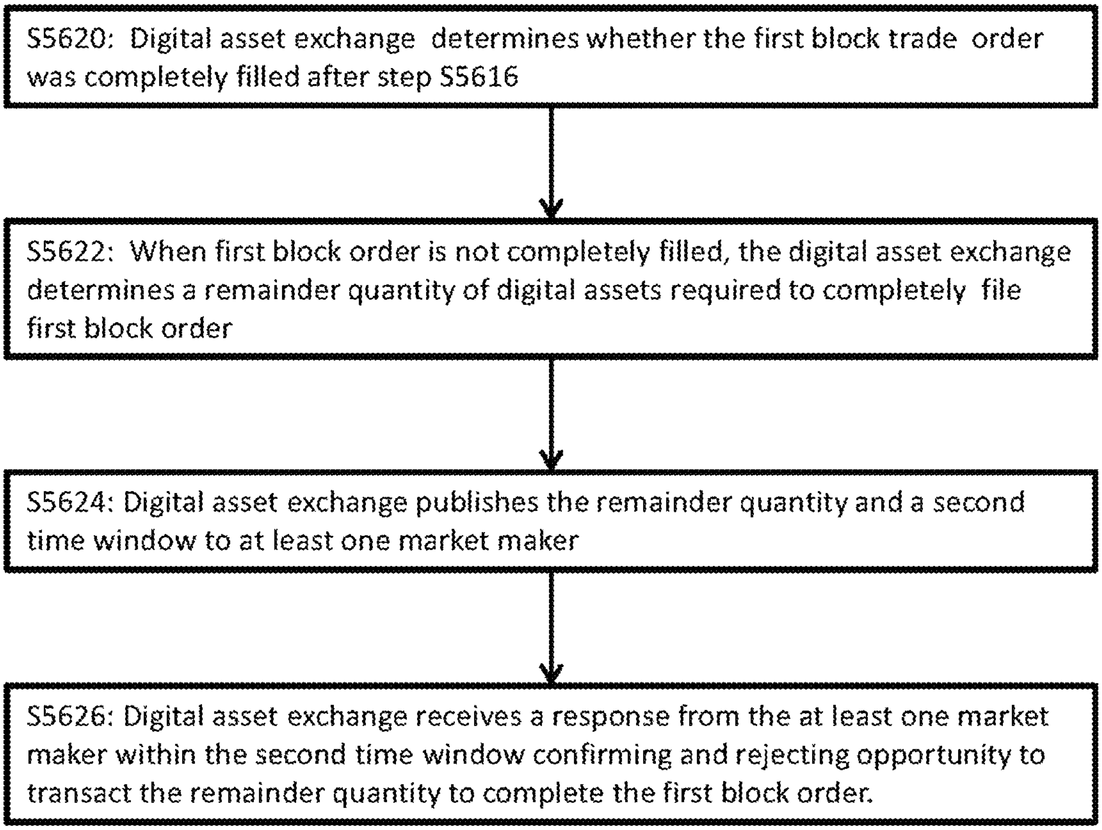

In embodiments, if a block trade order does not result in the order being completely filled as may be determined at step S5620 of FIG. 56A, an optional second indication of interest may be sent to one or more market makers to fill the remaining block trade order, at the worst successful price. Specifically, where it is determined that the first block trade order has not been completely filled at step S5620, the digital asset exchange computer system 3230 may determine a remainder quantity of the digital asset, which is the quantity of digital assets necessary to completely fulfill the first block trade offer at step S5622. In embodiments, the digital asset exchange computer system 3230 will then publish this remainder quantity to at least one market maker and offer the market maker the opportunity to purchase/sell the remainder quantity such that the first block trade offer can be completely fulfilled at step S5624. In embodiments, such a second indication of interest may be sent in price-time priority to the market makers included in the partially filed block order with a second time window to accept or reject the offer. The at least one market maker must transmit the response to accept or reject the offer in the second time window as is indicated in step S5626. By way of example, if the first time window is set at 1 minute for the block order book, the second time window could be set at 5 seconds for the optional second indication of interest. In embodiments, this optional second indication of interest may be sent to each market maker included in the partially filled block trade order, in second time window increments (e.g., every 5 seconds) until the order is completely filled or each of the market makers are exhausted. In embodiments, market makers whose responses were not included in the block order book may receive the optional second indication of interest, if the order is not filled by the market makers included in the order book. In embodiments, the second indication of interest may only be completely filled. In embodiments, the second indication of interest may be partially filled. It is noted that the steps of FIG. 56A are optional since the first block order may remain only partially filled.

In step S5618, the digital asset exchange computer system updates user accounts (including takers and successful market makers in the block trade order book) based on block changes, and lifts, as appropriate, any unused reserves. This update may include any transactions made with respect to the steps of FIG. 56A as well. In embodiments, completed block trade information may be published as part of a public distribution feed. In embodiments, such publication may be time delayed, e.g., for 10 minutes.

EXAMPLES

The following example illustrates embodiments of the present invention. It is not intended to be limiting. It will be appreciated by those of skill in the art that embodiments may be applied to other use cases not specifically called out herein without departing from the present invention.

Example 1

FIG. 59 illustrates an exemplary process flow of messages sent in a block trade order in an exemplary embodiment of present invention.

At time T1 (the initiation of the process), a taker (Fund X) places an order message 5902 to the digital asset exchange computer system 3230 for a block trade order on the buy side of 1,000 BTC at a maximum price of $10,100. At the time T1, the bid/ask spread from the continuous book is $9,999/$10,001.

In response to receipt of the order message 5902, the digital asset exchange computer system 3230 determines the collar to be $9,500 to $10,500 per BTC based on the bid/ask spread at T1, and verifies the request including that taker (FundX) has sufficient funds to perform the transaction. A fund hold is placed on taker's (FundX's) fiat account until the block trade order process is completed based on the amount of the maximum price of $10,100 (e.g., $10,100×1000 units=$1,010,000, in Example 1).

Thereafter, once the block trade order has been verified, and sufficient fiat to cover taker FundX's maximum price has been reserved, the digital asset exchange computer system 3230 publishes message 5904 (the indication of interest message) to each of the n qualified market makers, Market Maker 1, Market Maker 2 . . . Market Maker n as also shown in FIG. 59. In embodiments, such publication may be made via an automated programming interface (API) connection, such as used by electronic trading programs. As illustrated, the market makers are only shown the quantity and digital asset (e.g., 1,000 BTC in Example 1) to be traded and the collar (e.g., $9,500/10,500 in Example 1) and are not informed of side or price information (e.g., taker is buying and the maximum price set). A time maximum (e.g., 1 minute in Example 1) may be shown as illustrated in message 5904. Market makers are not required to maintain full-reserve, and may be granted operational advances. Operational advance limits are preferably fixed, and generally made on a customer-by-customer basis, and can be adjusted from time to time. In Example 1, the collar is set at plus or minus 5% of the spot price at time T1 as determined by the bid/ask spread of the continuous order book for the digital asset (e.g., BTC). Thus, all trades must execute within this collar.

Market makers may be required to meet a minimum bid requirement (e.g., $50,000 notional in Example 1). In embodiments, market makers can submit multiple price levels on each side.

Once the block order is initiated and published, market makers have a fixed time period (e.g., 1 minute in Example 1) to respond. A timer 5804 may be used to track the time-out period for this block trade order book for request 5902. FIG. 59 illustrates exemplary responses 5906*a*, 55906*b*, 5906*c* provided by Market Maker 1, Market Maker 2 and Market Maker 3 at times T3, T4 and T5 respectively. All of these responses must be received during the time out period (i.e., by time T6=T2 plus 1 minute in Example 1) in order to be considered in the block trade order book for request 5902.

Once these responses are received and the time limit to respond has expired at time T6, the responses 5906*a*, 5906*b* and 5906*c* are crossed with the request 5902 and the block trade order is completed automatically based on the winning matches with no further input from either taker or makers. In Example 1, trades are filled based on price-time priority only and partial fills are permitted. In other words, the best price wins, and if there is a tie, the earliest of the tied prices wins. In embodiments, trades may be filled on other priorities too. The minimum fill size is always at least one block size minimum (e.g., 10 BTC in Example 1) and market makers must quote at least the minimum block size. In Example 1, the trade is completed between Market Maker 1 and taker since Market Maker 1 submitted the best price at the earliest time T3 and that request fills the order.

At time T6, the digital asset exchange computer system 3230 notifies taker that the block trade order is completed in full, via exemplary message 5908*a*. Separately, the digital asset exchange computer system 3230 notifies Market Maker 1, as the winner, via exemplary message 5908*b*, that the order has been filled and the amount and price of the transaction and the amount of digital assets that have been advanced. In embodiments, the market makers that made bids which were not accepted, may optionally be notified that their respective bids failed (not shown). In embodiments, only successful market makers will be notified. In Example 1, the continuous book is not crossed for block trades. Trade information for the block trade order in response to request 5902 may be published on a delayed basis, such as a fixed period (e.g., 10 minutes in Example 1) after the block trade order is completed (time T6 in Example 1).

Example 2

FIG. 59A illustrates another exemplary process flow of messages sent in a block trade order in accordance with exemplary embodiments of present invention.

As in FIG. 59, at the initiation of the process (time T1 in Example 2), the taker (Fund X in Example 2) places an order message 5902 to the digital asset exchange computer system 3230 for a block trade order on the buy side of 1,000 BTC at a maximum price of $10,100. As in FIG. 59, at the time T1, the bid/ask spread from the continuous order book for the digital asset (BTC in Example 2) is $9,999/$10,001.

In response to receiving the order message 5902, the digital asset exchange computer system 3230 determines the collar to be $9,500 to $10,500 per BTC based on the bid/ask spread at T1, and verifies the request as noted above. A fund hold is placed on taker FundX's fiat account until the block trade order process is completed based on the amount of the maximum price of $10,100 (e.g., $10,000×1000 units=$1,010,000, in Example 2).

Thereafter, once the block order has been verified, and sufficient fiat to cover taker's (FundX's) maximum price has been reserved, the digital asset exchange computer system 3230 publishes message 5904 including the indication of interest message to each of the n qualified market makers, Market Maker 1, Market Maker 2 . . . Market Maker n, as also shown in FIG. 59. In embodiments, as discussed with Example 1, such publication may be made via an API connection, such as used by electronic trading programs. As illustrated in FIG. 59A, the market makers are only shown the quantity and digital asset (e.g., 1,000 BTC in Example 2) to be traded and the collar prices (e.g., $9,500/10,500 per BTC unit in Example 2) and are not informed of side or price information (e.g., taker seeks to buy and taker's maximum price). A time maximum (e.g., 1 minute in Example 2) may be shown as illustrated in message 5904. In Example 2, the collar is also plus or minus 5% of the spot price at time T1 as determined by the bid/ask spread of the continuous order book for the digital asset pair. All trades must execute within this collar.

As with Example 1, market makers may be required to meet a minimum bid requirement (e.g., $50,000 notional in Example 2). In embodiments, market makers are submitting multiple price levels on each side.

Once the block order is initiated and published to the market makers, they have a fixed time period (e.g., 1 minute in Example 2) in which to respond. Timer 5804 may be set to track this time-out period. In Example 2, as illustrated in FIG. 59A, exemplary responses 5906*a*' and 5906*d*' are provided by Market Maker 1 at times T3' and T6', respectively. Market Maker 2 sends exemplary responses 5906*b*' and 5906*e*' at times T4' and T7', respectively. Market Maker 3 sends exemplary responses 5906*c*' and 5906*e*' are sent at times T5' and T8', respectively. Only responses received by the end of the time-out period (Time T9' which is T2 plus 1 minute, in Example 2) will be considered in the block trade order book for request 5902.

Once these responses are received and the time limit has expired at time T9', the responses 5906*a*', 55906*b*', 5906*c*',

5906*d*', 5906*e*', 5906*f*' are crossed with the request 5902 and the block trade order is completed automatically as noted above. The trade in Example 2 is partially filled by Market Maker 1 and Market Maker 3, as the matches that meet the price-time priority within the parameters of the block trade order book for request 5902. In particular, Market Maker 1 sells 300 BTC to taker at a price of $10,020, 300 BTC to taker at a price of $10,050 while Market Maker 3 sells 100 BTC to taker at a price of $10,050.

At time T9, the digital asset exchange computer system 3230 notifies taker that the block trade order is partially filled and the prices at which partial fulfilment took place in the exemplary message 5908*a*'. The digital asset exchange computer system 3230 also notifies Market Maker 3 of that that one of their offers has been accepted and the terms of the accepted offer via exemplary message 5908*c*'. Separately, the digital asset exchange computer system 3230 notifies Market Maker 1, as another partial winner, via exemplary message 5908*b*', that their offers have been accepted and filled and the amount and prices of these transactions.

Since taker's order is only partially fulfilled, the digital asset exchange computer system 3230 may offer one or more successful market makers the opportunity to fulfill the remainder of taker's order. In embodiments, the successful market makers may be offered the opportunity to fulfill the remainder of taker's order. In embodiments, the market maker offering the best price, Market Maker 1 in Example 2, is offered the opportunity to fulfill the remainder of the order at the best price in message 5908*b*'. In embodiments, market makers must respond to the opportunity to fulfill the remainder of the order within a second time limit (e.g., 5 seconds, 10 second or 15 seconds to name a few). In embodiments, Market Maker 3, may be offered an opportunity to fulfill the remainder of the taker's order in message 5908*c*', if Market Maker 1 does not accept this opportunity within the time limit. In other embodiments, Market Maker 1 and Market Maker 3 may each be offered the opportunity to fulfill a portion of the remainder of the order in the messages 5908*b*' and 5908*c*'. In embodiments, all of the market makers may be offered the opportunity to fulfill the remainder of the order with the market maker first to respond with the best price being awarded the remainder of the order. In embodiments, the remainder may run as a new order book, with either the same time limits, or shorter time limits. In any event, as in FIG. 59, trade information to the extent completed, whether it be for the entire order or a portion thereof, may be published on a delayed basis, such as, after a fixed period (e.g., 10 minutes in Example 2) after time T9, when the block trade order is completed.

Non-Custodial Trading Using Scripted Accounts

Customers of a digital asset exchange may, in embodiments, trade digital assets on a digital asset exchange using bi-directional channels and one or more scripted accounts via an application programing interface (API). Trading via an API using bi-directional channels and one or more scripted accounts enables a customer to trade digital assets on a digital asset exchange while minimizing the risk of losing digital assets due to a data incident or data breach. As used herein, a scripted account is one or more scripted accounts which include at least one scripting limitation. The at least one scripting limitation, in embodiments, may specify instances that require multiple signatures to authorize a transaction. In embodiments, the at least one scripting limitation may specify instances that do not require multiple signatures to authorize a transaction. In embodiments, the scripted account may be a pay-to-script-hash (P2SH) account. In embodiments, alternative to and/or in combination with the one or more scripted accounts, customers of a digital asset exchange may trade digital assets on a digital asset exchange using bi-directional channels and one or more smart contracts.

Trading digital assets on a digital asset exchange may require a customer to pre-fund a scripted account. Using one or more scripted accounts, in embodiments, adds an extra layer of security to the digital assets being traded by the customer. For example, the scripted account may include instructions that authorize transactions signed by a private key associated with the customer, preventing the digital asset exchange from unilaterally accessing the funds associated with the customer. As another example, the scripted accounts may prevent the authorization of transactions before a predetermined amount of time has elapsed. Continuing the example, during this predetermined amount of time, the customer may send orders and transaction requests signed by the customer private key to the digital asset exchange. In embodiments, the orders and transaction requests may be recorded and/or stored off the blockchain by the digital asset exchange until the predetermined amount of time has elapsed. Once the predetermined amount of time has elapsed, in embodiments, the digital asset exchange may have the authority to settle the transactions, executing the digitally signed transaction requests. The transactions, when executed, in embodiments, may result in both the digital asset exchange receiving the digital assets which were requested to be transferred out of the scripted account address and the customer receiving any remaining digital assets in the scripted account.

In embodiments, one or more channels may be set up between two or more digital asset exchanges, so that each channel may transfer digital assets using one-way or bi-directional channels. In embodiments, channels may be created using scripted accounts (such as used with BITCOIN), and/or smart contracts (such as used with Ether), to name a few. In embodiments, one or more channels between two exchanges having a common customer may be used. For example, the common customer may request that digital assets be transferred from exchange 1 to exchange 2, and a channel between the two exchanges can be used for an instant transfer. This embodiment overcomes technical challenges created by on-chain transfer which not only take transaction time, but also incur transactions fees.

Figure 76:
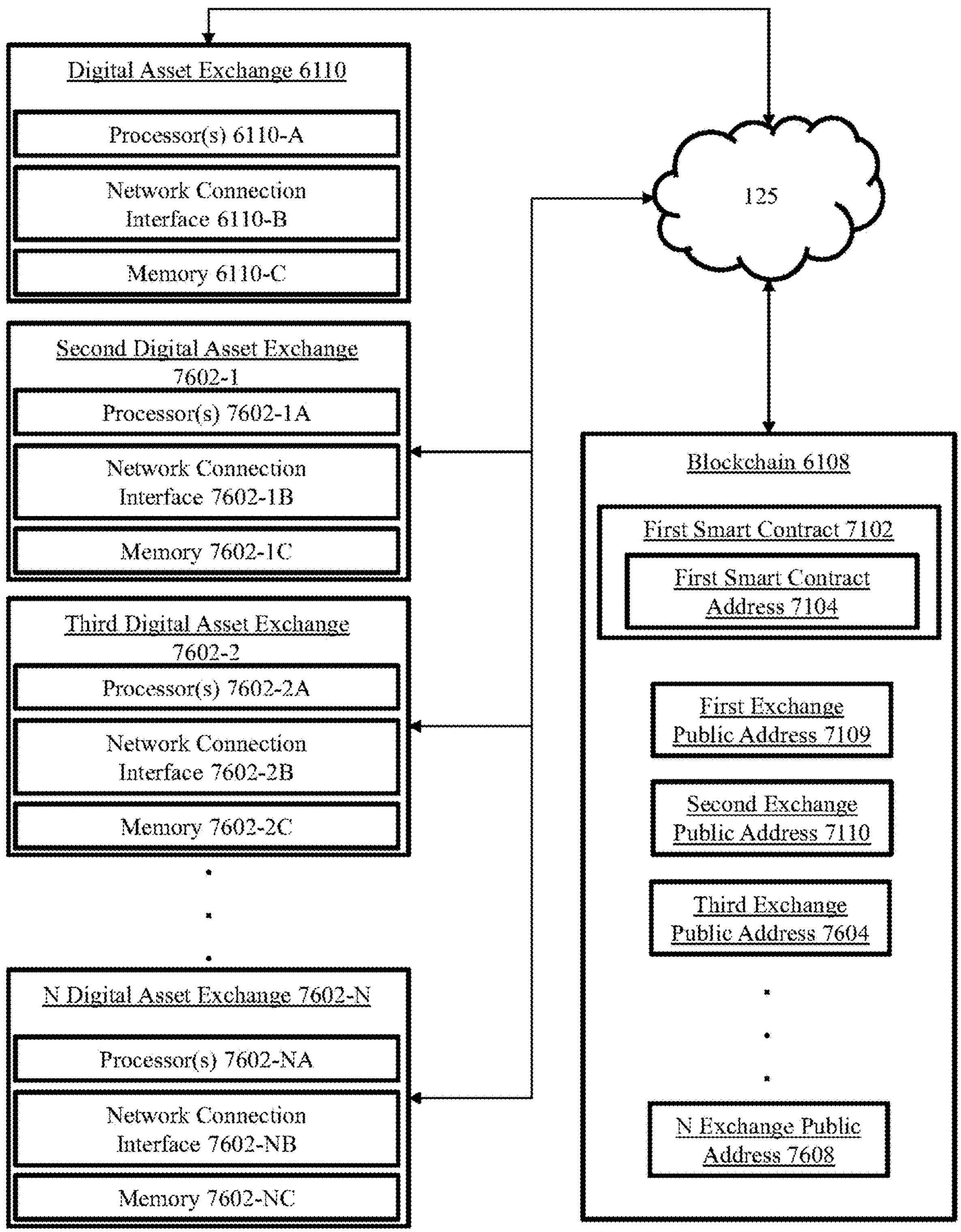

Referring to FIG. 76, multiple digital asset exchanges (e.g., Digital Asset Exchange 6110, Second Digital Asset Exchange 7602-1, Third Digital Asset Exchange 7602-2 . . . N Digital Asset Exchange 7602-N, to name a few) may each have public addresses (e.g., first exchange public address 7109, second exchange public address 7110, third exchange public address 7604 . . . N exchange public address 7608, respectively, to name a few) on the blockchain 6108. While FIG. 76 illustrates N Digital Asset Exchanges, in embodiments, there may be only two Digital Asset Exchanges, three Digital Asset Exchanges, or more to name a few. Continuing the example, the first customer may be a customer of Digital Asset Exchange 6110 (e.g., the first digital asset exchange) and the Second Digital Asset Exchange 7602-1. From a customer perspective, in embodiments, to trade a first amount of a first digital asset from the digital asset exchange 6110 to the second digital asset exchange 7602-1, the customer may only have to submit an order to the first digital asset exchange 6110, resulting in the execution of the order by both digital asset exchanges. From a digital asset exchange perspective, digital asset exchanges, in embodiments, may receive a plurality of orders from a plurality of customers. Many of the plurality of orders placed by customers may be inter-exchange orders. To accommodate the number of customers placing inter-exchange orders, the digital asset exchange 6110 and the second digital asset exchange 7602-1 may use a bi-directional channel, or more than one bi-directional channels, and one or more of: one or more scripted accounts, and/or one or more smart contracts, to name a few to transfer assets between the exchanges.

In embodiments, trading may be performed using bi-directional channels which may enable both digital asset exchanges to fill inter-exchange orders while minimizing the risk of losing digital assets due to a data incident or data breach.

In embodiments, trading digital assets on a digital asset exchange may require one or both of the digital asset exchanges to pre-fund a channel, such as a scripted account and/or smart contract. In embodiments, both digital asset exchanges may be required pre-fund the channel with a predetermined amount of digital asset. The predetermined amount of digital asset, in embodiments, may refer to a particular number of digital asset (e.g., 10 BITCOIN) and/or a value of the digital asset (e.g., $100,000 worth of BITCOIN). For example, a first digital asset exchange and a second digital asset exchange may be required to pre-fund the channel with, e.g., 50 BITCOINs.

In embodiments, using one or more channels may add an extra layer of security to the exchange of digital assets by the digital asset exchanges. For example, the scripted account and/or smart contract may include instructions that authorize transactions signed by a private key associated with the first digital asset exchange (e.g., digital asset exchange 6110), preventing the second digital asset exchange (e.g., second digital asset exchange 7602-1) from unilaterally accessing the funds associated with the first digital asset exchange. As another example, the channels may prevent the authorization of transactions before a predetermined amount of time has elapsed. Continuing the example, during this predetermined amount of time, the first digital asset exchange may send interim orders and transaction requests signed by a private key associated with the first digital asset exchange to the second digital asset exchange to alter the balance of digital assets to be associated with the first digital asset exchanges and the second digital asset exchange. In embodiments, the orders and transaction requests may be recorded and/or stored off the blockchain by the second digital asset exchange (and/or the first digital asset exchange) until the predetermined amount of time has elapsed. Once the predetermined amount of time has elapsed, in embodiments, the second digital asset exchange may have the authority to settle the transactions, executing the digitally signed transaction requests. The transactions, when executed, in embodiments, may result in both the second digital asset exchange receiving the digital assets which were requested to be transferred out of the scripted account address and the first digital asset exchange receiving any remaining digital assets in the scripted account. In embodiments, the execution of the transaction may be implemented on the blockchain.

In embodiments, the orders between the digital asset exchanges may represent one or more orders from customers seeking to make an inter-exchange transaction.

Referring to the process illustrated in connection with FIGS. 63A-63D, in embodiments, the process of trading on a digital asset exchange 6110 using bi-directional channels and scripted accounts via an application programing interface (API) 6107 may begin at step S6302. At step S6302*a* first user device 6104 associated with a customer (e.g., first customer 6202) may connect with a digital asset exchange computer system 6102 associated with the digital asset exchange 6110 via API 6107 associated with the digital asset exchange computer system 6102. The connection, in embodiments, may allow the first user device 6104 to communicate with the digital asset exchange computer system 6104 over network 125 using API 6107 of the digital asset exchange computer system 6104, as shown in connection with FIG. 61A. To connect with the digital asset exchange computer system, a user device associated with the customer (e.g., first customer 6202) may send a request from the first user device 6104 to the digital asset exchange computer system 6102 via network 125. In embodiments, in response to receiving the request, the digital asset exchange computer system 6102 may process and accept the request and set up the connection. In embodiments, a completed connection may be signaled and/or confirmed by the digital asset exchange computer system 6102 by generating and transmitting a confirmation message to the first user device 6104.

In embodiments, once the connection between the digital asset exchange computer system 6102 and the first user device 6104 is established, at step S6304, a first mathematical puzzle and corresponding first mathematical solution may be generated. In embodiments, the digital asset exchange computer system 6102 may generate the first mathematical puzzle and first mathematical solution. In embodiments, the timing of the generation of the puzzle may vary. For example, puzzles may be pre-generated in advance of the communication channel being first created, and/or may be generated on the fly at some point after the first API connection used to establish the channel. In embodiments, as described above, the bi-directional channel may be between a first digital asset exchange computer system 6102 and a second digital asset exchange computer system associated with the second digital asset exchange 7602-1. In embodiments, a first mathematical puzzle and corresponding first mathematical solution may be generated by the first digital asset exchange computer system 6102. In embodiments, the second digital asset exchange computer system may generate a second mathematical puzzle and corresponding second mathematical solution.

To generate the first mathematical puzzle and solution and the second mathematical puzzle and solution, the digital asset exchange computer system 6102 may, in embodiments, provide an algorithm used to generate the puzzle and solution. In embodiments, and as used herein, algorithm and/or hash algorithm, may refer to one or more of the following: (1) a mathematical algorithm; (2) a one-way hash function; (3) a cryptographic hash function; (4) a one-way function; (5) a trapdoor one-way function; (6) a Data Encryption Standard encryption algorithm; (7) a Blowfish encryption algorithm; (8) An Advanced Encryption Standard or Rijndael encryption algorithm; (9) a Twofish encryption algorithm; (10) an IDEA encryption algorithm; (11) an MD5 encryption algorithm; (12) an MD4 encryption algorithm; (13) a SHA 1 hashing algorithm; (14) an HMAC hashing algorithm; and/or (15) an RSA Security algorithm, to name a few. The algorithm, in embodiments, may be applied to a puzzle seed that is obtained by the digital asset exchange computer system 6102. In embodiments, the puzzle seed may be a randomly generated series of numbers, letters, and/or characters. Alternatively, in embodiments, the puzzle seed may be a semi-randomly generated series of numbers and/or letters based on at least one of the following: (1) the first user public address (e.g., the public address associated with the first customer 6202); (2) a first exchange public key (e.g., the first exchange public key 6122-1 associated with the digital asset exchange computer system 6102); (3) a second exchange public key (e.g., the second exchange public key 6122-2 associated with the digital asset exchange computer system 6102); and/or (4) a third exchange public key (e.g., the third exchange public key 6122-3 associated with the digital asset exchange computer system 6102), to name a few. In embodiments, the first user public address may be a public address on blockchain 6108 and associated with the first customer 6202. The first user public address may be associated with the first user public key 6120. In embodiments, the first user public key 6120 may correspond to a first user private key—which combined may be a first user key pair.

In embodiments, one or more processor(s) 6102-A of the digital asset exchange computer system 6102 may apply an algorithm to a puzzle seed to generate a first mathematical puzzle. Continuing the example, the algorithm may be applied to the first mathematical puzzle. The result of the second application of the algorithm may be the corresponding first mathematical solution. In embodiments, the algorithm may be applied a plurality of times, resulting in a plurality of mathematical puzzles and corresponding solutions. Thus, in embodiments, the first mathematical puzzle may be a plurality of mathematical puzzles. Similarly, the corresponding first mathematical solution may be a plurality of mathematical solutions. An example of an overly simplified algorithm applied to a puzzle seed, resulting in a plurality of mathematical puzzles and corresponding solutions, is illustrated in connection with FIG. 116 for exemplary purposes. For the purposes of the example in the below table, (1) the puzzle seed is 123456; and (2) the algorithm applied is X*4+5, where X represents the puzzle seed. Thus, the first puzzle may be (123456)*4+5, or in other words, 493829.

TABLE 1-A

| | Puzzle | Solution |
|---|---|---|
| First Puzzle/Solution: | 493829 | 1975321 |
| Second Puzzle/Solution: | 1975321 | 7901289 |
| Third Puzzle/Solation | 7901289 | 31605161 |
| Fourth Puzzle/Solution: | 31605161 | 126420649 |
| Fifth Puzzle/Solution: | 126420649 | 505682601 |

As another example, below is a second table illustrating an exemplary generation of puzzle sequences for a sequence of length 5.

TABLE 1-B

| | Value |
|---|---|
| Puzzle Seed: | fd8c373d34931f7c2edad4d82c09c3e120ee0b2a09416416124f0d4d768d5748 |
| Puzzle #5 | 7452fa77c71f7a2696e5e81177c80a8fb5c71bdfldcee2d4b2c94b2aba7ccfb2 |
| Puzzle #4 | 448cd914d4baaa94940d9ef6d0674a94d743fd3bb3ece91f2295c7fleac5fa0a |
| Puzzle #3 | 0e136f49bf847edc0ccf35a90a2dbd87b551439a2cealb8ff817f950c0e806le |
| Puzzle #2 | 5af2db926af985f25e2ddbcdb24db5f58a44476ea840bbbd4a51c0d978b4852c |
| Puzzle #1 | 689af04fa477accc9fe21482e3cflc44842b29b5cbb8e7f022797ce7f1301c3b |

Table 1-B, in embodiments, may be an example of an asymmetric puzzle. An asymmetrical puzzle sequence, for example, may refer to a puzzle sequence including N puzzles, where the Nth puzzle is generated first, based off the seed. Continuing the example, the second puzzle in the puzzle sequence, the N-1 puzzle, may be generated second based of the Nth puzzle. This may continue until the first puzzle is generated. The below diagram, in embodiments, may illustrate the order in which an asymmetric puzzle sequence is generated.

As shown in the above diagram, the seed is hashed to create the Nth puzzle, which is hashed to create the N-1 Puzzle which continues until the Second Puzzle is hashed to create the First Puzzle. Hashed, as used herein, may refer to the application of a hash algorithm.

In practice, the algorithm and seeds used to generate the puzzle and solution will be more complex, and each layer may potentially use a different algorithm to increase complexity and avoid reserve engineering of puzzle solutions. In embodiments, by building a nested puzzle/solution basis, where the current solution to the current puzzle is the next puzzle, the process can be more efficient.

As shown in the above table, in embodiments, the first mathematical solution may correspond to the second mathematical puzzle. Similarly, the second mathematical solution may correspond to the third mathematical puzzle. Moreover, the third mathematical solution may correspond to the fourth mathematical puzzle. Furthermore, the fourth mathematical solution may correspond to the fifth mathematical puzzle. In embodiments, the digital asset exchange computer system 6102 may continue applying the algorithm, generating dozens, hundreds, thousands, millions, and/or billions of puzzle/solution combinations. In embodiments, each puzzle/solution combination may be unrelated. In embodiments, the first user device 6104 may generate the first mathematical puzzle and corresponding solution. In embodiments, alternative to or in connection with puzzles and solutions, the present invention may utilize one or more additional protocols such as the eltoo protocol.

The corresponding first solution to the first mathematical puzzle may be used to protect the first customer 6202 in the event of a security incident or breach (described more fully below in connection with FIG. 63F, the description of which applying herein). If there is a security incident or breach, the digital asset exchange computer system 6102 may transmit the solution to the corresponding solution to the first user device 6104 to allow the first customer 6202 to retrieve any and/or all digital assets at risk before the first-time designation has transpired. Because the solution may enable a customer to drain a scripted account prematurely and/or retrieve assets that were previously transferred or sold via a transaction during the first-time designation, in embodiments the digital asset computer exchange system 6102 may only transmit the mathematical puzzle to the first user device 6104, storing the corresponding solution for later use if needed.

Figure 61A:
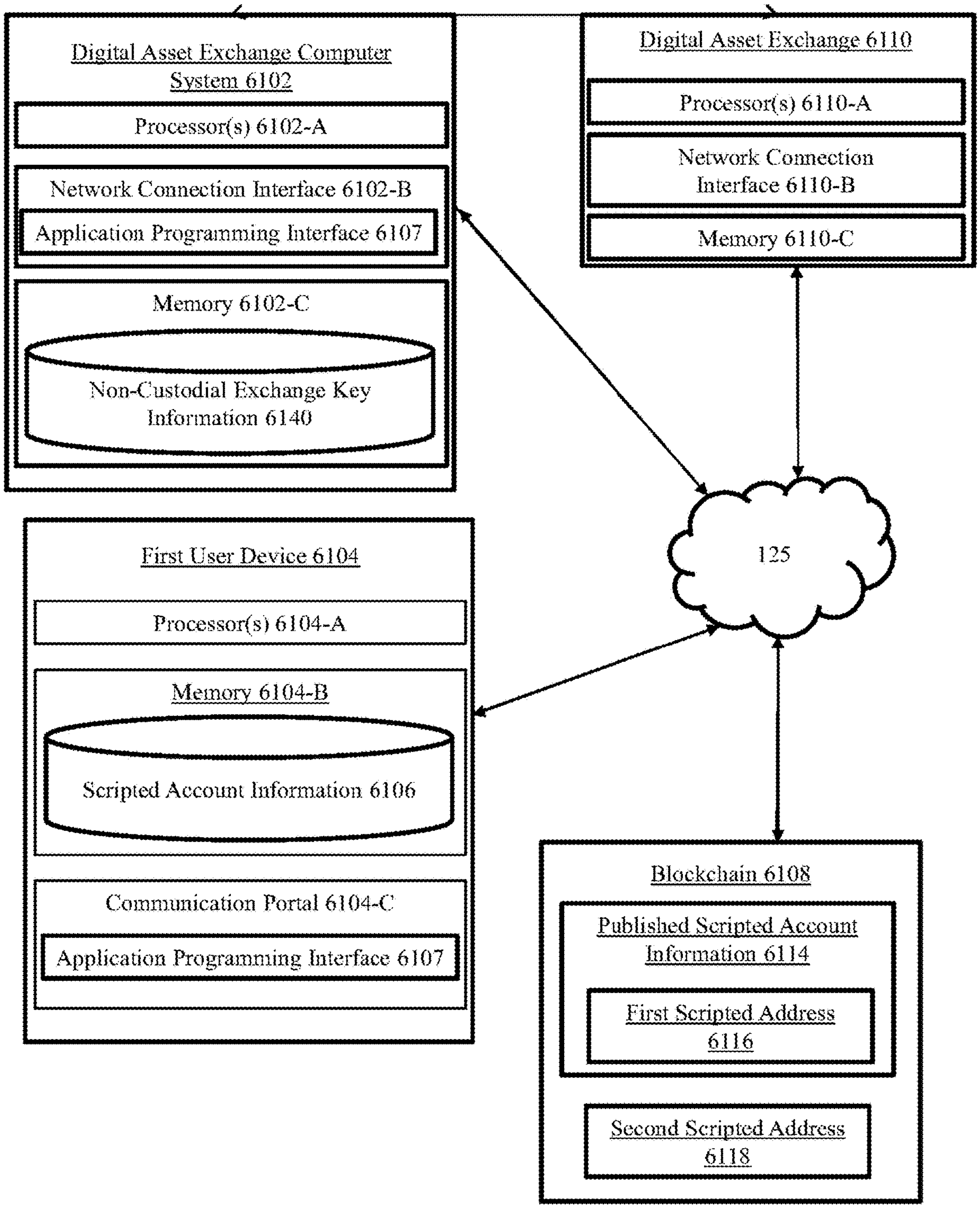
FIG. 61A is an exemplary block diagram illustrating a digital asset exchange computer system communicating with a first user device via an application programming interface (API) in accordance with exemplary embodiments of the present invention.
Figure 61B:
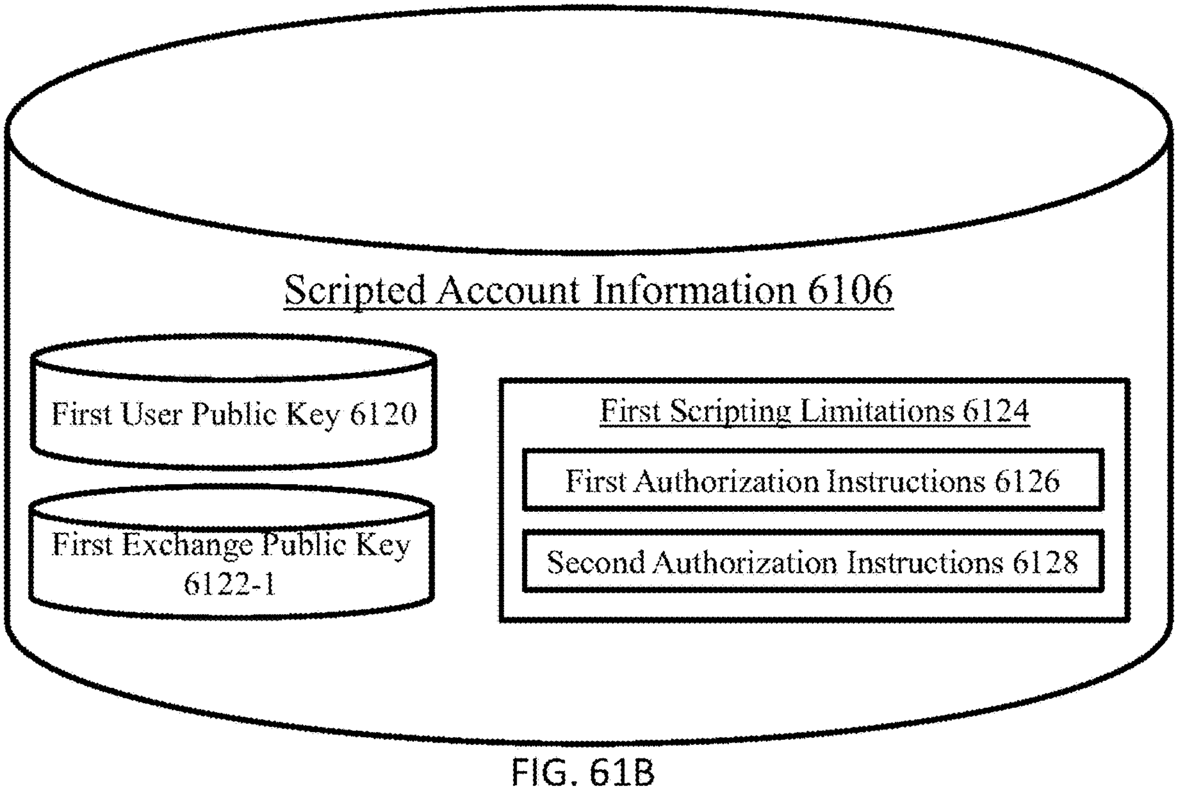
FIGS. 61B-61C are exemplary block diagrams illustrating scripted account information in accordance with exemplary embodiments of the present invention.
Figure 61C:
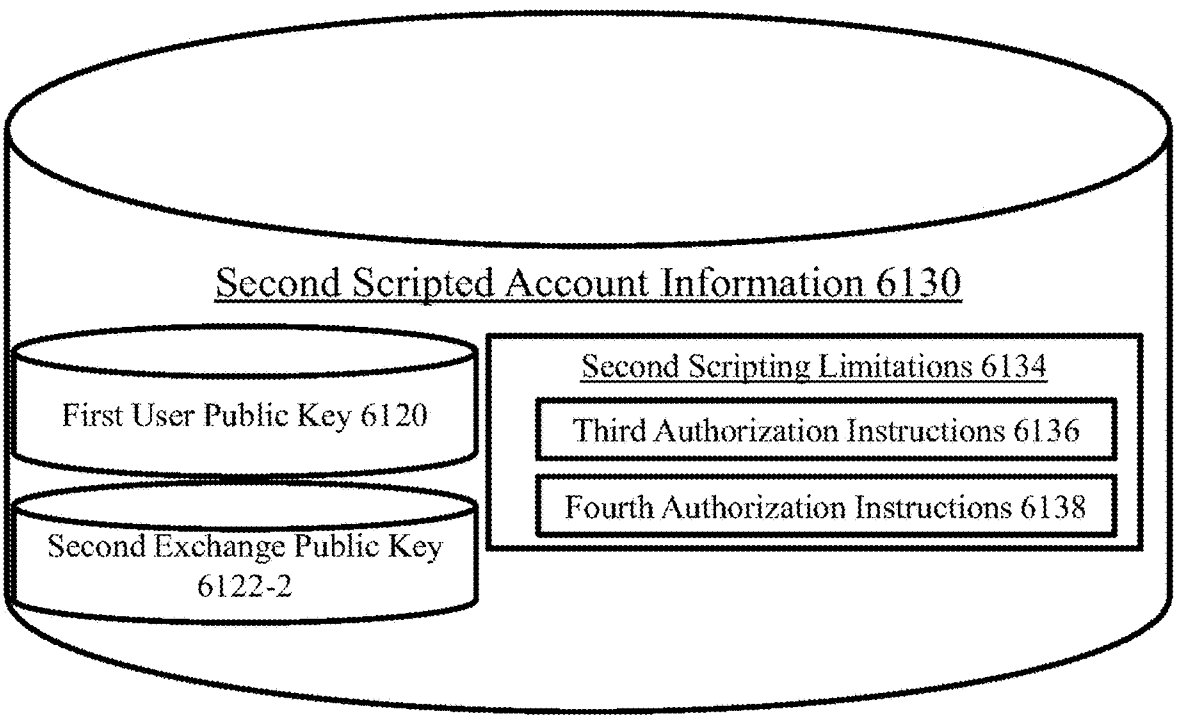
Figure 61D:
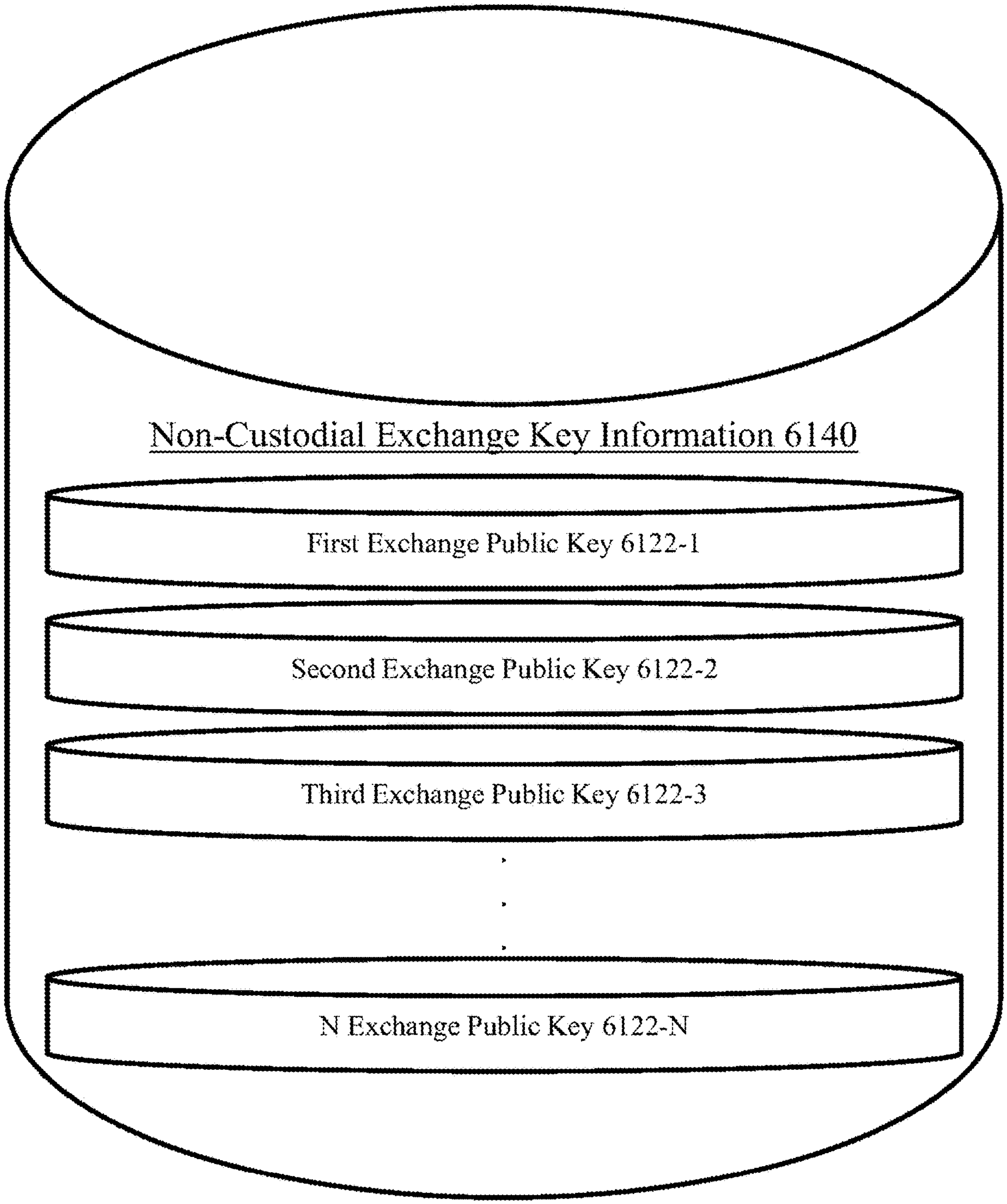
FIG. 61D is an exemplary block diagram illustrating non-custodial exchange key information in accordance with exemplary embodiments of the present invention.

At step S6306, in embodiments, the digital asset exchange computer system 6102 may provide non-custodial exchange key information 6140. Referring to FIGS. 61A and 61D, the non-custodial exchange key information 6140 may be stored on memory 6102-C of the digital asset exchange computer system 6102. The non-custodial exchange key information 6140 may be the information required by the first user device 6104 to trade on the digital asset exchange. The non-custodial exchange key information 6140, as shown in FIG. 61D, may include a plurality of exchange public keys. For example, the non-custodial information may include a first exchange public key 6122-1, a second exchange public key 6122-2, a third exchange public key 6122-3 . . . and an N exchange public key 6122-N. Each exchange public key, in embodiments, may be used for a different purpose. For example, the first exchange public key 6122-1 may be used for the creation of a first scripted address associated with a first scripted account. As another example, the second exchange public key 6122-2 may be used to generate orders and/or transaction requests (e.g., trades on the digital asset exchange). As yet another example, the third exchange public key 6122-3 may be used to generate a settlement transaction (e.g., the final transaction that sums up and finalizes all of the orders and/or transactions between the first customer 6202 and the digital asset exchange 6110).

In embodiments, as described above, the bi-directional channel may be between a first digital asset exchange computer system 6102 and a second digital asset exchange computer system associated with the second digital asset exchange 7602-1. In embodiments, non-custodial key information 6140 may be provided by both the digital asset exchange computer system 6102 and the second digital asset exchange computer system.

In embodiments, each exchange public key may be associated with the digital asset exchange 6110 and correspond to a respective private key. For example, the first exchange public key 6122-1 may correspond to a first exchange private key—which, together may be a first key pair. As another example, the third exchange public key 6122-3 may correspond to a third exchange private key—which, as with above, together may be a third key pair. In embodiments, each exchange public key may be mathematically related to its respective exchange private key. Each exchange public key, in embodiments, may correspond to a respective public address associated with a digital asset. For example, the second exchange public key 6122-2 may correspond to a second exchange public address associated with the digital asset. As yet another example, the N exchange public key 6122-N may correspond to an N exchange public address associated with the digital asset. The digital asset, in embodiments, may be maintained on a distributed public transaction ledger maintained in the form of a blockchain (e.g., blockchain 6108) by a plurality of geographically distributed computer systems in a peer-to-peer network in the form of a blockchain network. In embodiments, the first exchange public key 6122-1, the second exchange public key 6122-2, the third exchange public key 6122-3 . . . and the N exchange public key 6122-N may all be the same public key, and thus same corresponding private key. In embodiments, the first key set may be the same or different than the second key set and/or third key set, to name a few. Similarly, the second key set may be the same or different than the third key set. In embodiments, each key set may also be unique.

The non-custodial exchange key information 6140, in embodiments, may also include first scripting limitations 6124; second scripting limitations 6134; and/or authorized public key information, to name a few. The first scripting limitations 6124 may be scripting limitations associated with a first scripted account which may include authorization instructions (e.g., first authorization instructions 6126 and second authorization instructions 6128). The authorization instructions may define scenarios where transaction requests received by the first scripted account are authorized. For example, the authorization instructions may authorize transactions only if either: (1) the transaction request is signed by two private keys, one being associated with the first customer 6202 and the second being associated with the digital asset exchange 6110; or (2) the transaction request is signed by a private key associated with the customer and is received after a predetermined amount of time has transpired. Continuing the above example, the first scripting limitations may include first authorization instructions that require transactions to be received from a public address associated with the customer (e.g., the first user public address and the first customer 6202 respectively) that are digitally signed by both a private key associated with the public address and a private key associated with an exchange public address.

Figure 62A:
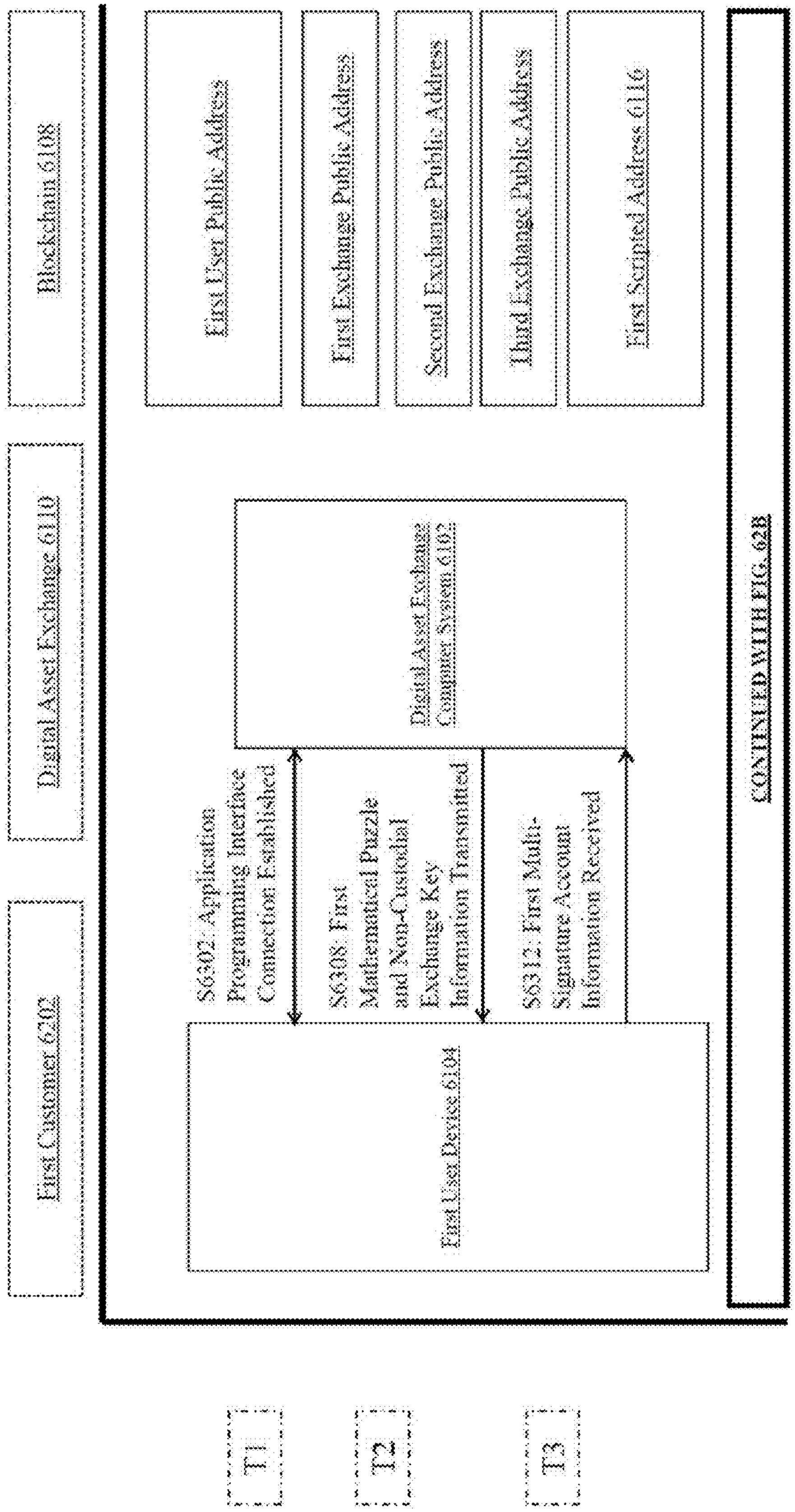
FIGS. 62A-62E are conceptual flow diagrams illustrating a customer trading on a digital asset exchange via an API between a digital asset exchange computer system and a first user device in accordance with exemplary embodiments of the present invention.
Figure 62B:
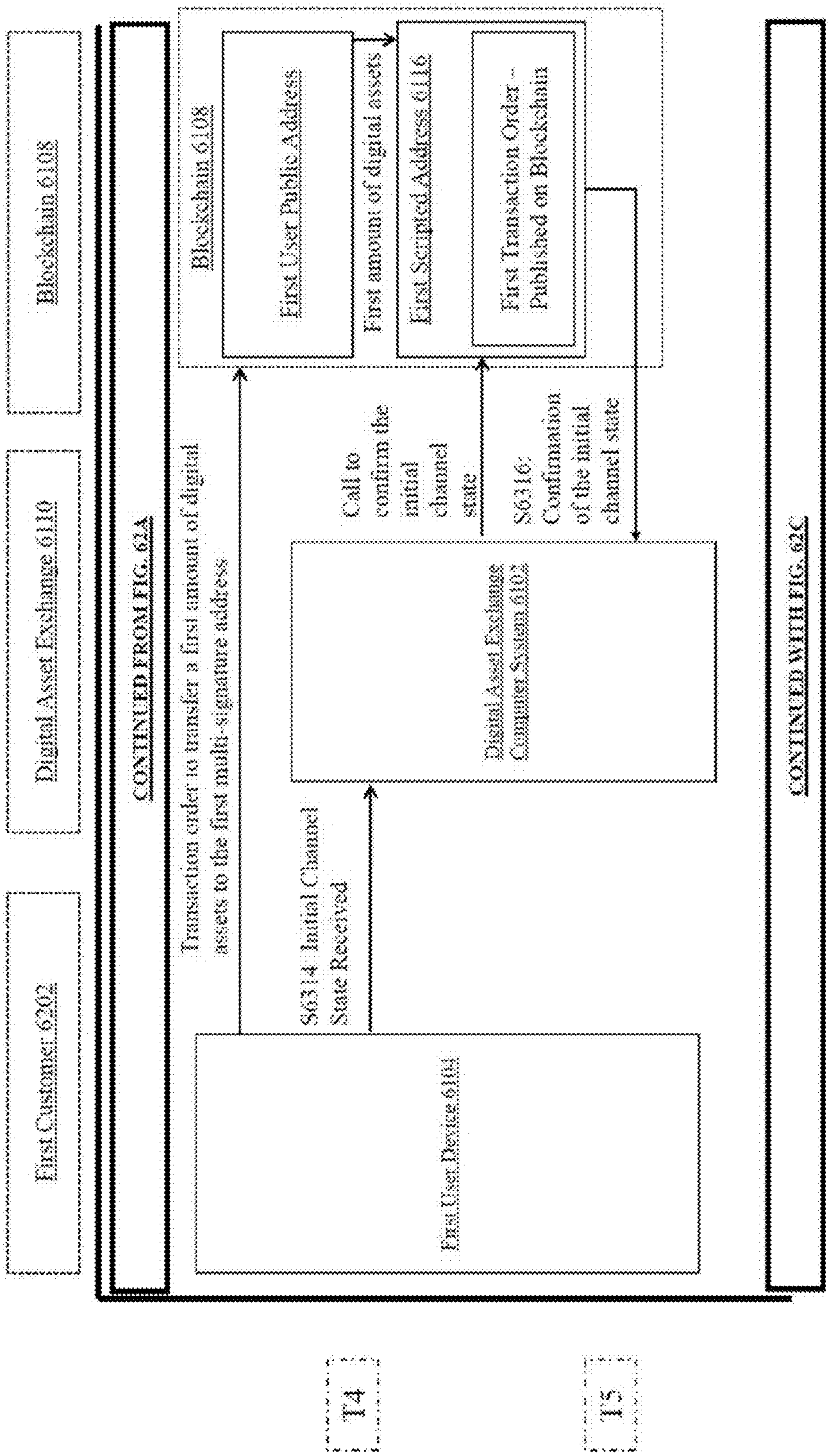
Figure 62C:
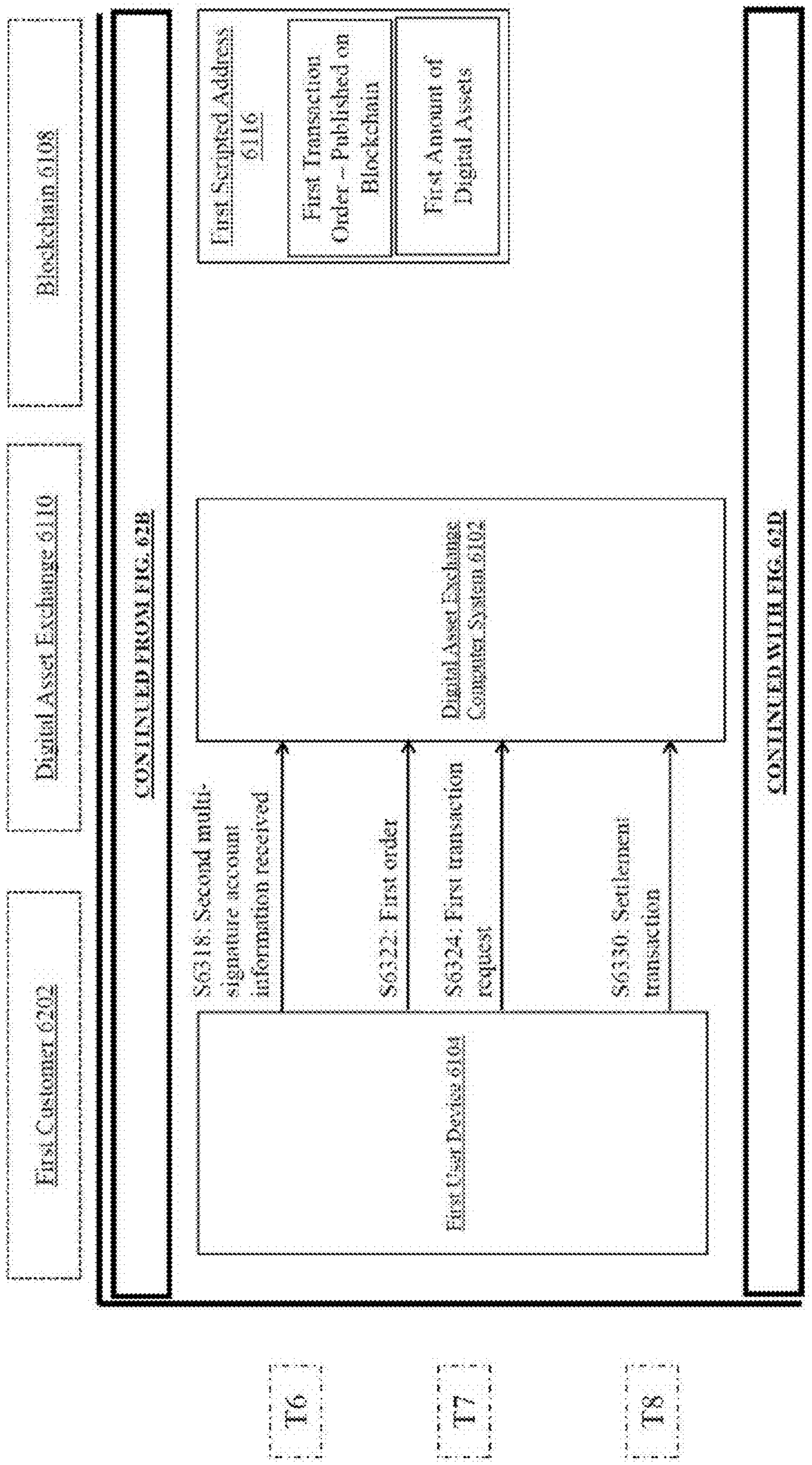
Figure 62D:
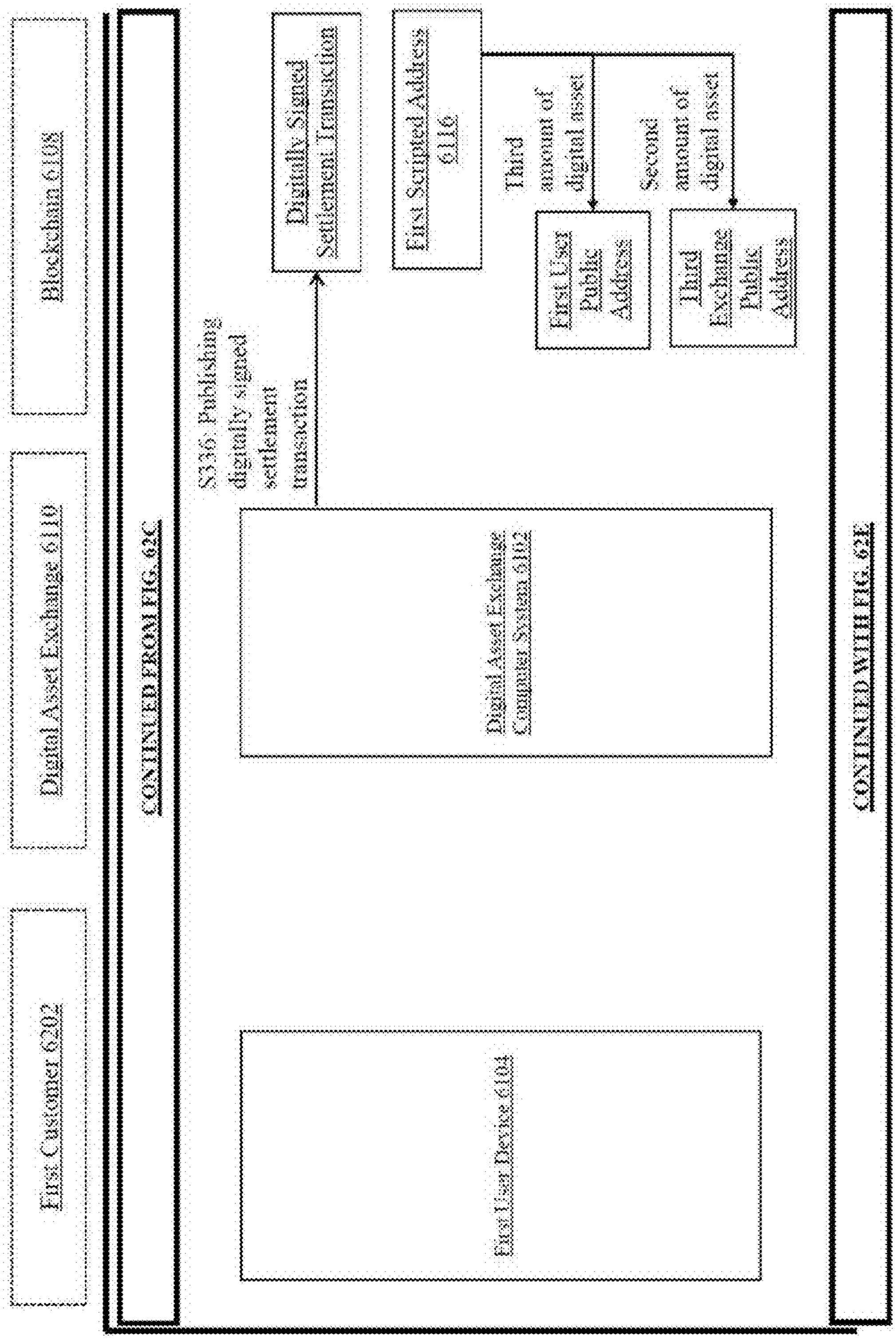

Continuing the above example, the first scripting limitations may also include second authorization instructions that require transactions digitally signed by a private key associated with the public address associated with the customer. The first-time designation, in embodiments, may refer to a specific time, e.g., 6:00 PM EST. For example, referring to FIGS. 62A-62E, the first customer 6202 may begin its trading session at time T1 (e.g., the beginning of the day), the time at which the first user device 6104 and the digital asset exchange computer system 6102 have established a connection. Time T1 (as shown in FIG. 62A), for the purposes of this example, T1 may refer to 9 AM. The first-time designation, in embodiments, may be represented by time T9 (as shown in FIG. 62D), which for the purposes of this example may refer 5 PM. Thus, in this example, the first-time designation transpires at 5 PM.

The second scripting limitations 6134 may be scripting limitations associated with a second scripted account which may also include authorization instructions (e.g., third authorization instructions 6136 and fourth authorization instructions 6138). Similarly, the authorization instructions may define scenarios where transaction requests received by the second scripted account are authorized. For example, the authorization instructions may authorize transactions only if either: (1) the transaction request is signed by a private key associated with the digital asset exchange and is received after the predetermined amount of time has transpired (the third authorization instructions 6136); or (2) the transaction request is signed by a private key associated with the customer and includes the first mathematical solution (the fourth authorization instructions 6138). In embodiments, a scripted account may include one or more scripting limitations.

The authorized public key information, in embodiments, may identify one or more public keys that the first customer 6202 has identified as an authorized public key for the purposes of trading on the digital asset exchange 6110. For example, the authorized public key information may indicate that the first user public key 6120 is an authorized public key associated with the first customer 6202. The authorized public key information, in embodiments, may be stored and later accessed by the digital asset exchange computer system 6102 for the purposes of verifying one or more of the following: (1) the first customer 6202; (2) messages received on behalf of the first customer 6202; (3) orders placed by the first customer 6202; (4) transaction requests received from the first customer 6202; and/or (5) scripted account information received from the first customer 6202, to name a few. In embodiments, the authorized public key information may be a whitelist (described more fully below).

The first mathematical puzzle and/or non-custodial trading information may be provided, in step S6308, to the customer. In embodiments, the digital asset exchange computer system 6102 may transmit the first mathematical puzzle and/or non-custodial trading information to the first user device 6104 via network 125. In embodiments, the digital asset exchange computer system 6102 may provide the first mathematical puzzle and/or non-custodial trading information to the first customer 6202 via an intermediary. For example, the digital asset exchange computer system may publish the non-custodial trading information on a website. The website, in embodiments, may be password protected such that the first customer 6202 may be the only person capable of accessing the non-custodial trading information. In embodiments, the website may be publicly available.

In embodiments, the first user device 6104 or the digital asset exchange computer system 6102 may generate first scripted account information 6106. In embodiments, the first scripted account information 6106 may be information associated with the first scripted account (e.g., scripting limitations) which may enable both the customer 6202 and the digital asset exchange 6110 to understand and abide by the limitations associated with the first scripted account and corresponding address. For example, referring to FIG. 61B, the first scripted account information 6106 may include: (1) the first user public key 6120; (2) the first exchange public key 6122-1; (3) first scripting limitations 6124; (4) first scripted address 6116; and/or (5) a first-time designation, to name a few. In embodiments, the first scripted address 6116 may be generated by applying a hash algorithm to one or more of the following: (1) the first scripting limitations 6124; (2) the first scripted account information 6106; (3) the first user public key 6120; (4) the first exchange public key 6122-1; (5) the second exchange public key 6122-2; (6) the third exchange public key 6122-3; (7) the first mathematical puzzle; and/or (8) a combination thereof, to name a few. In embodiments, the first scripted address 6116 may also be generated by combining the first user public key 6120 and one or more of the following: (1) the first exchange public key 6122-1; (2) the second exchange public key 6122-2; and/or (3) the third exchange public key 6122-3, to name a few. In embodiments, the first scripted address 6116 may also be generated by applying a hash algorithm to one or more of the following: (1) the first user public key 6120; (2) the first exchange public key 6122-1; (3) the second exchange public key 6122-2; (4) the third exchange public key 6122-3; and/or (5) the first mathematical puzzle, to name a few. Once generated, in embodiments, the first scripted account information 6106 may be stored on memory 6104-B of the first user device 6104. Furthermore, referring to FIG. 63A at step S6310, in embodiments, the first scripted account information 6106 may be transmitted by the first user device 6104 via API 6107 over network 125 to the digital asset exchange computer system 6102.

In embodiments, as described above, the bi-directional channel may be between a first digital asset exchange computer system 6102 and a second digital asset exchange computer system associated with the second digital asset exchange 7602-1. The first scripted account information 6106 may be generated and/or transmitted by one or more of the first digital asset exchange computer system 6102 and the second digital asset exchange computer system.

In embodiments, at step S6312, the digital asset exchange computer system 6102 may verify that the first scripted account information 6106 complies with exchange format requirements. In embodiments, the exchange format requirements may include requirements associated with (1) the first user public key 6120, (2) the public key associated with the digital asset exchange 6110; (3) the authorization instructions associated with the first scripting limitations 6124; (4) the authorization instructions associated with the second scripting limitations 6134; and/or (5) the public address associated with the scripted account (e.g., the first scripted address 6116 and/or the second scripted address 6118), to name a few. In embodiments, as described above, the bi-directional channel may be between a first digital asset exchange computer system 6102 and a second digital asset exchange computer system associated with the second digital asset exchange 7602-1. The second digital asset exchange computer system, in embodiments, may verify the first scripted account information 6106.

The digital asset exchange computer system 6102, in embodiments, may verify the first user public key 6120 is a first authorized public key associated with the first customer 6202 by accessing authorized public key information received from the first customer 6202. In embodiments, the digital asset exchange computer system 6102 may have a list of authorized public keys and the customers said authorized public keys are associated with. This list may be populated by authorized public key information received by one or more customers. The aforementioned list, in embodiments, may be stored on memory 6102-C and accessed by the digital asset exchange computer system 6102. For example, to verify the first user public key 6120, the digital asset exchange computer system 6102 may access the list of authorized public keys and associated customers for the purposes of comparing the first user public key 6120. The digital asset exchange computer system 6102, in embodiments, may verify the first user public key 6120 by comparing the first user public key 6120 to a list of authorized public keys associated with the first customer 6202. In embodiments, if the first user public key 6120 is not verified, the process may continue with FIG. 63E, which is described in more detail below, the description of which applying herein.

In embodiments, the digital asset exchange computer system 6102 may further verify the first user public key 6120 by comparing the first user public key 6120 to a whitelist associated with the first customer 6202. A more detailed description of this process is located below in connection with the description of FIG. 66, the description of which applying herein.

The digital asset exchange computer system 6102, in embodiments, may verify the first exchange public key 6122-1 is a second authorized public key by comparing the first exchange public key 6122-1 to a list of exchange public keys that are authorized by the digital asset exchange 6110. In embodiments, the digital asset exchange computer system 6102 may be verifying to confirm that the first customer 6202 has the correct exchange public key to trade on the digital asset exchange 6110. In embodiments, if the first exchange public key 6122-1 is not verified, the process may continue with FIG. 63E, which is described in more detail below, the description of which applying herein.

The digital asset exchange computer system 6102, in embodiments, may verify the first scripting limitations 6124 include authorized instructions by comparing the first authorization instructions 6126 and the second authorization instructions 6128 to a list of authorized instructions stored on memory 6102-C. In embodiments, the authorized instructions may be code templates with blanks for specific information (e.g., the first user public key 6120, the first exchange public key 6122-1, and/or the first-time designation, to name a few). The code template(s), in embodiments, may be provided to the first customer 6202 from the digital asset exchange computer system 6102 with the non-custodial exchange key information 6140 and/or prior to the first user device 6104 generating the first scripted account information 6106. If the first user public key 6120 and the first exchange public key 6122-1 are verified, in embodiments, the digital asset exchange computer system 6102 may compare the remaining code in the first scripting limitations 6124 to the authorized code template. In embodiments, if the first scripting limitations 6124 is not verified, the process may continue with FIG. 63E, which is described in more detail below, the description of which applying herein.

The digital asset exchange computer system 6102, in embodiments, may verify the first scripted address 6116. In embodiments, as noted above, the first scripted address 6116 may be generated by applying a hash algorithm to the first scripting limitations 6124. The hash algorithm, in embodiments, may be provided to the first customer 6202 from the digital asset exchange computer system 6102 with the non-custodial exchange key information 6140 and/or prior to the first user device 6104 generating the first scripted account information 6106. Alternatively, the hash algorithm and/or the hashing parameters associated with the hash algorithm, in embodiments, may be provided by the first customer 6202 to the digital asset exchange computer system 6102 with the first scripted account information 6106. In embodiments, the digital asset exchange computer system 6102 may verify the first scripted address 6116 by applying the hash algorithm to the received first scripting limitations 6124. The result of the application of the hash algorithm may be compared by the digital asset exchange computer system 6102 to the received first scripted address 6116, resulting in a determination of whether the first scripted address 6116 is verified. As another example, referring to FIG. 62B, the digital asset exchange computer system 6102 may send a call to the first scripted address 6116, to confirm whether the first scripted address 6116 is correct. In embodiments, if the first scripting limitations 6124 are not verified, the process may continue with FIG. 63E, which is described in more detail below, the description of which applying herein.

Once the first scripted account is generated and the first scripted account information 6114 is verified, the first customer 6202 may fund the first scripted address 6116 (e.g., with a funding transaction). In embodiments, referring to FIG. 62B, the first user device 6104 may transmit a digitally signed transaction request to the blockchain 6108 via network 125. The transaction request, in embodiments, may be a request to transfer a first amount of the digital assets from the first user public address to the first scripted address 6116. In embodiments, the transaction request may be digitally signed by the first user private key associated with the first user public key 6120. As a result, the transaction request may be executed and published via the blockchain network to the blockchain 6108, resulting in the first amount of digital asset being transferred to the first scripted address 6116.

In embodiments, as described above, the bi-directional channel may be between a first digital asset exchange computer system 6102 and a second digital asset exchange computer system associated with the second digital asset exchange 7602-1. The second digital asset exchange computer system, in embodiments, may transmit a digitally signed transaction request to the blockchain 6108 via network 125. In embodiments, the transaction request may be digitally signed by a private key associated with the second digital asset exchange.

Figure 63A:
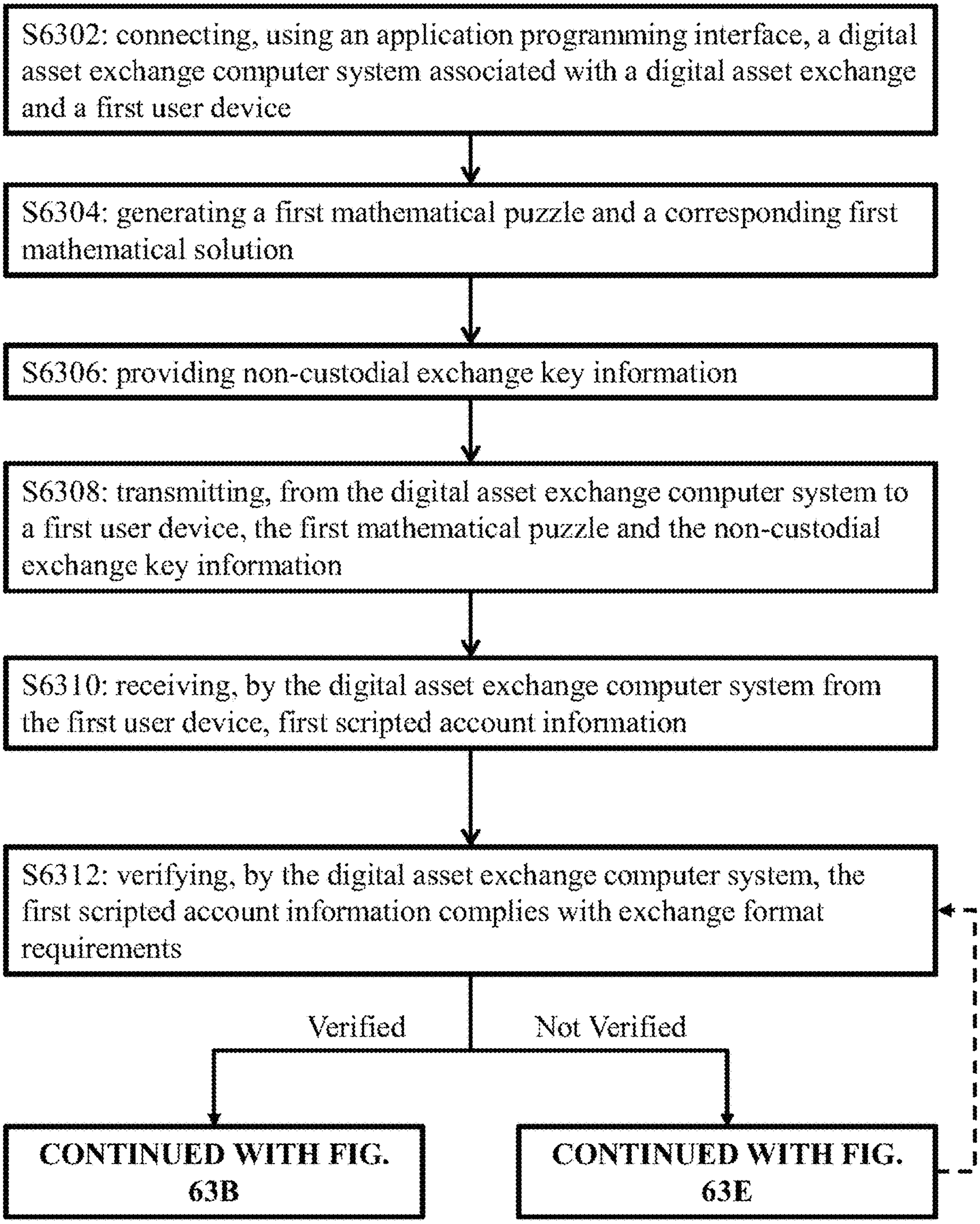
FIGS. 63A-63D are exemplary flowcharts of a process for trading on a digital asset exchange via an API between a digital asset exchange computer system and a first user device in accordance with exemplary embodiments of the present invention.
Figure 63B:
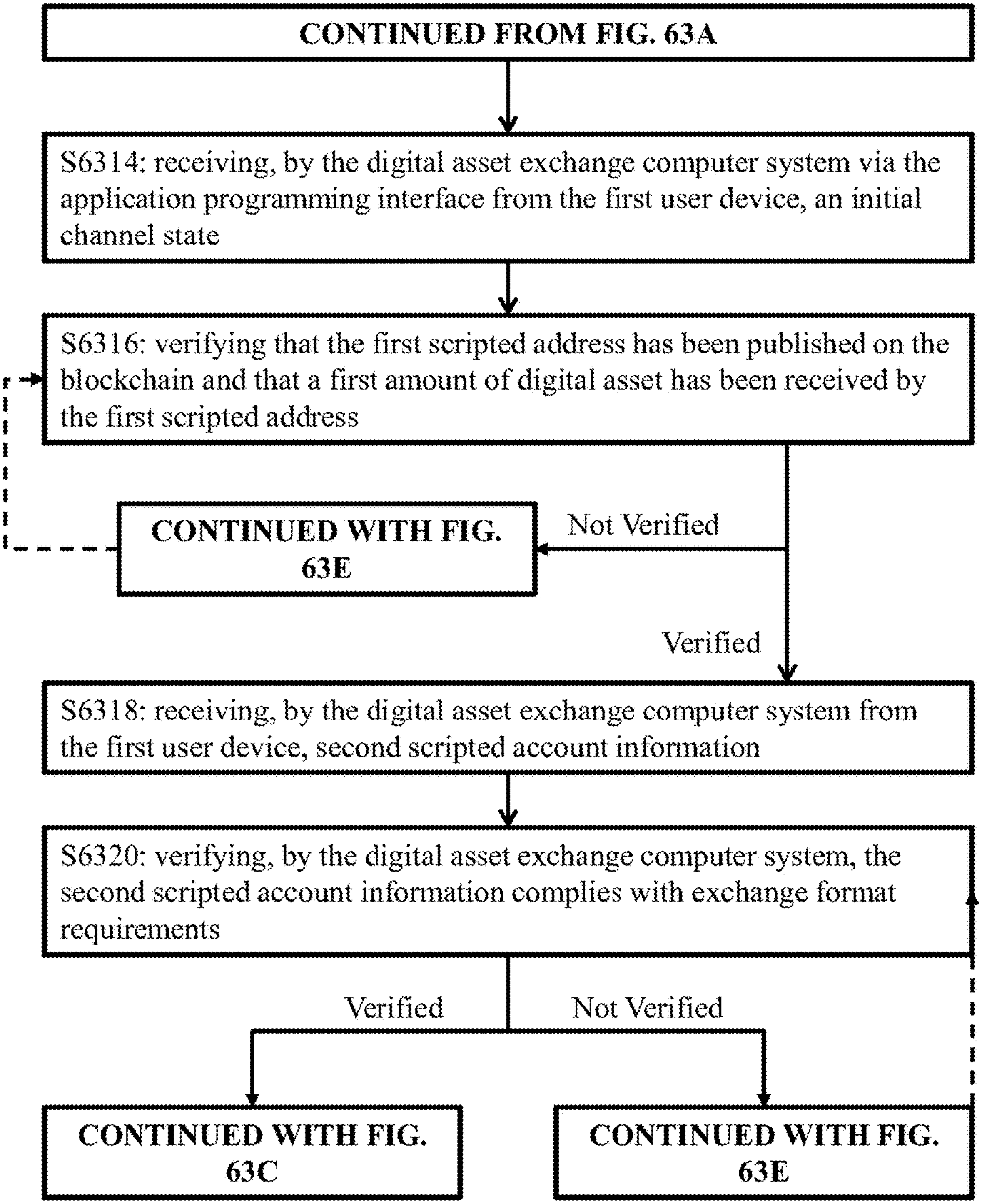
Figure 63C:
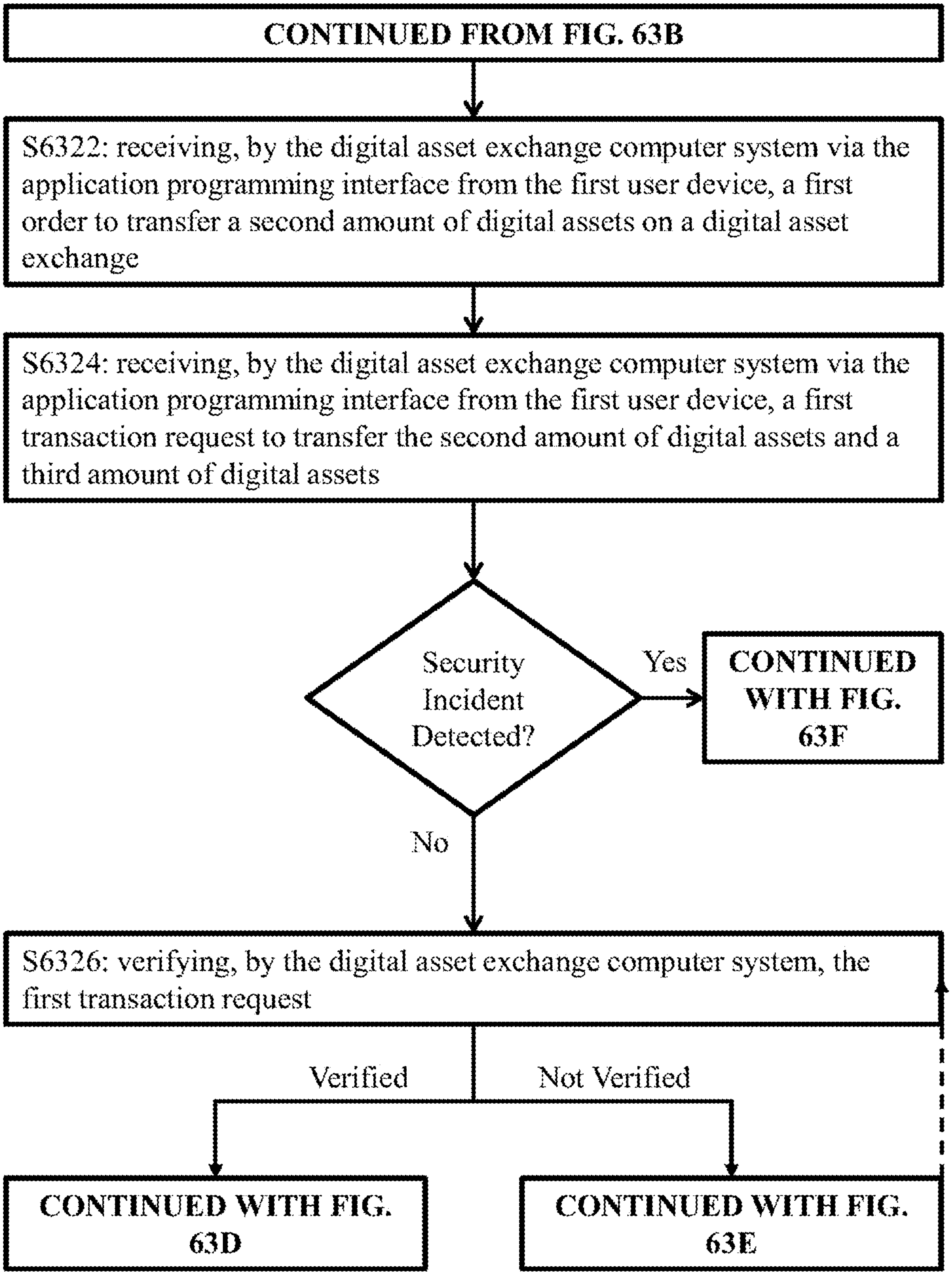
Figure 64:
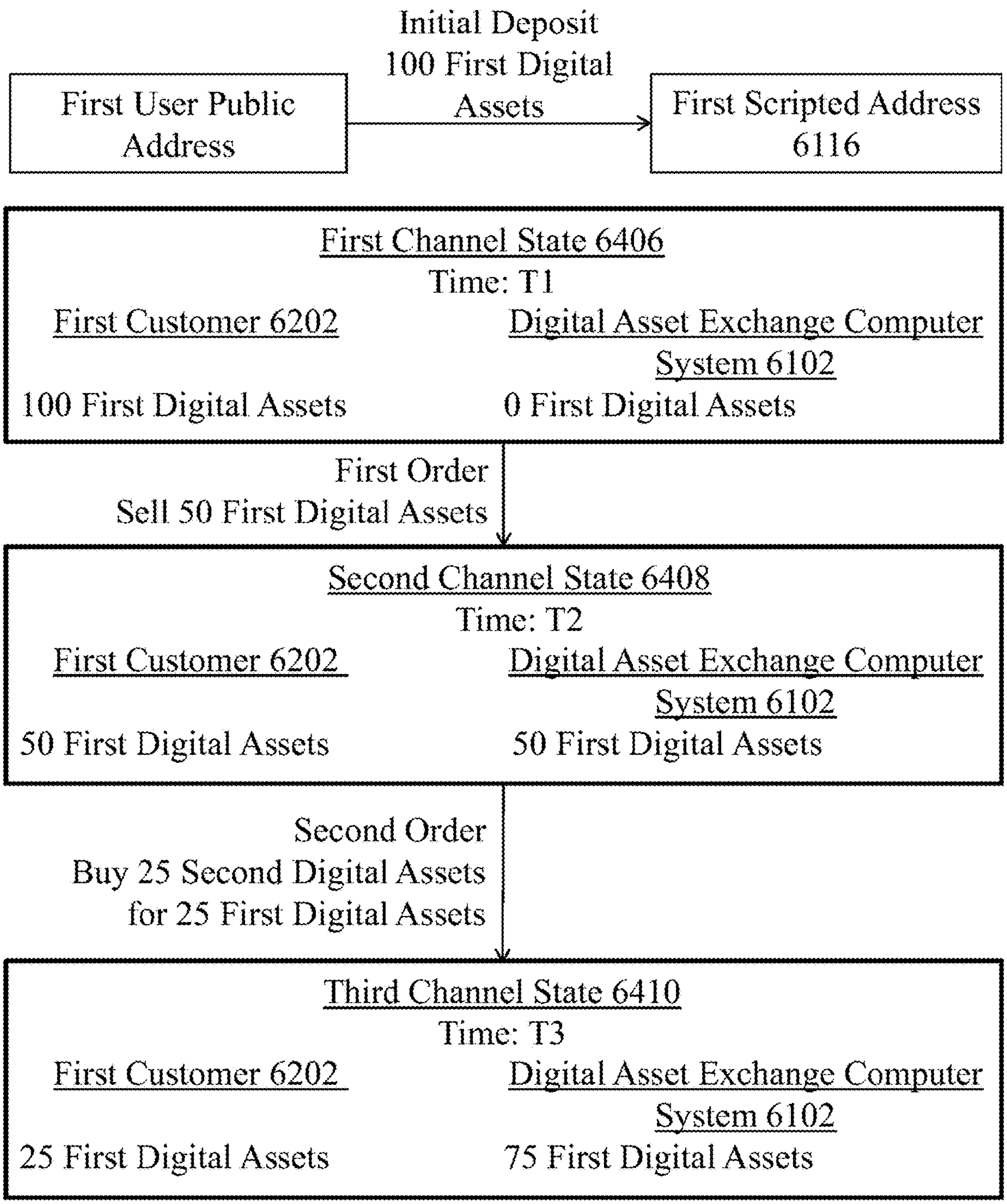
FIG. 64 is a conceptual flow diagram of channel states during a process for trading on a digital asset exchange via a channel between a digital asset exchange computer system and a first user device in accordance with exemplary embodiments of the present invention.

Referring to FIG. 63B, after the first scripted address 6116 is funded, the digital asset exchange computer system 6102 may receive an initial channel state from the first user device 6104 via the API 6107. In embodiments the digital asset exchange computer system 6102 may receive an initial channel state from the second digital asset exchange computer system. Referring to FIG. 64, the initial channel state, in embodiments, may be the first channel state 6406. In embodiments, the first channel state 6406 may indicate that the first customer 6202 owns the first amount of digital asset (e.g., as shown in FIG. 64, 100 digital assets) in the custody of the first scripted address 6116. The first channel state 6406 may also indicate that the digital asset exchange computer system 6102 (or, in embodiments, the digital asset exchange 6110, or both) owns 0 digital asset. In embodiments, the first channel state 6406 may have a time stamp indicating one or more of the following: (1) the time at which the first amount of digital asset was deposited into the first scripted address; (2) the time at which the first channel state 6406 was sent; (3) the time at which the first channel state 6406 was received; (4) the first-time designation; and/or (5) the time left until the first-time designation has transpired, to name a few. Once received, the digital asset exchange computer system 6102 may store the initial channel state (first channel state 6406) in a database stored in memory 6102-C. In embodiments, the first customer 6202 may fund the first scripted address 6116 prior to, during, and/or after sending the first scripted account information 6106. In embodiments, the first customer 6202 may transmit the initial channel state with the first scripted account information 6106.

Referring to FIG. 63B at step S6316, after receiving the initial channel state, the digital asset exchange computer system 6102 may confirm that the first scripted address 6116 has been published and that the first amount of digital asset was received by the first scripted address 6116. Referring to FIG. 62B, the digital asset exchange computer system 6102 may confirm the publishing and funding of the first scripted address 6116 by generating and sending a call to the first scripted address 6116 via network 125. The first scripted address 6116 may respond by generating and sending a return to the digital asset exchange computer system 6102 via network 125. The return, in embodiments, may confirm the existence and published nature of the first scripted address 6116. The return, in embodiments, may also confirm that the first scripted address 6116 was funded by the first customer 6202 with the first amount of digital asset. In embodiments, if the publishing and/or funding of the first scripted address 6116 is not verified, the process may continue with FIG. 63E, which is described in more detail below, the description of which applying herein.

In embodiments, the return may also include a timestamp that indicates one or more of the following: (1) the time at which the first amount of digital asset was deposited into the first scripted address; (2) the time at which the call was sent; (3) the time at which the return was sent; (4) the time at which the return was received by the digital asset exchange computer system 6102; (5) the first-time designation; and/or (6) the time left until the first-time designation has transpired, to name a few. The return timestamp may be used to update the channel state. For example, the initial channel state, if it included a time stamp, may have a first timestamp the time at which the initial channel state was received. For exemplary purposes, the first timestamp may indicate a time of 9:30 AM. Continuing the example, the return may include a second timestamp indicating when the return was sent. For exemplary purposes, the second timestamp may indicate a time of 9:32 AM. The digital asset exchange computer system 6102 may take the second timestamp and generate an updated channel state, which indicates similar information as the initial channel state, with the exception that the timestamp included in the initial channel state is changed to the second timestamp.

In embodiments, the digital asset exchange computer system 6102 may verify the publication and/or funding of the first scripted address 6116 by: (1) checking the first scripted address 6116 one or more times; (2) monitoring the first scripted address 6116 continuously; and/or (3) monitoring the first scripted address 6116 at regular intervals, to name a few.

In embodiments, in the event that the digital asset exchange computer system 6102 confirms that the first scripted address 6116 has been published and that the first amount of digital asset was received by the first scripted address 6116, the digital asset exchange computer system 6102 may generate and send a confirmation message to the first user device 6104. The confirmation message, in embodiments, may indicate that the first customer 6202 may begin trading with the first amount of digital asset on the digital asset exchange 6110. In the event the digital asset exchange computer system 6102 cannot confirm the first scripted address 6116 has been published and the first amount was received by the first scripted address 6116, the digital asset system may continue to monitor the block chain until it may be confirmed and/or after some period of time close the channel and terminate the transaction with the first user.

The first customer 6202 and/or digital asset exchange 6110 (and/or second digital asset exchange . . . N digital asset exchange), in embodiments, may employ a third party to monitor the first scripted address 6116 for any activity (e.g., a published transaction). To enable a third party to monitor the first scripted address, the first user device 6104 and/or the digital asset exchange computer system 6102 may generate and transmit monitoring information to a third-party computer system associated with the third party via network 125. The monitoring information, in embodiments, may include one or more of the following: (1) the first scripted address 6116; (2) the second scripted address 6118 (described more fully below); (3) the first exchange public address (associated with the first exchange public key 6122-1); (4) the second exchange public address (associated with the second exchange public key 6122-2); (5) the third exchange public address (associated with the third exchange public key 6122-3); (6) the first user public address (associated with the first user public key 6120); and/or (7) the first-time designation, to name a few.

In embodiments, the third-party computer system may monitor the blockchain for a published transaction on the first scripted address 6116 and/or the second scripted address 6118. This monitoring may be continuous, in substantially real time, and/or or at predetermined intervals, to name a few. For example, the third-party computer system may only check the first scripted address 6116 for a published transaction 30 minutes before the first-time designation transpires. If the third-party computer system detects a published transaction associated with the first scripted address 6116 and/or the second scripted address 6118, the third-party computer system may generate and send a notification to the first customer 6202 and/or digital asset exchange 6110. The notification, in embodiments, may indicate one or more of the following: (1) the published transaction; (2) the associated scripted account; (3) the public address that sent the published transaction; (4) the public address(es) that are a beneficiary of the published transaction; and/or (5) the time the transaction was published, to name a few. In embodiments, the third-party computer system may be similar to the first user device 6104 and/or the digital asset exchange computer system 6102, the descriptions of which applying herein.

Referring to FIG. 63B, second scripted account information 6130 may be generated by the first user device 6104 and/or the digital asset exchange computer system 6102. In embodiments, the second scripted account information 6130 may be information associated with a second scripted account for use by the blockchain. For example, referring to FIG. 61C, the second scripted account information 6130 may include: (1) the first user public key 6120; (2) the first exchange public key 6122-1; (3) the second exchange public key 6122-2; (4) second scripting limitations 6134; (5) second scripted address 6118; and/or (6) the first-time designation, to name a few. The second scripted address 6118 may be generated in a similar manner as the first scripted address 6116, the description of which applying herein. For example, the second scripted address 6118 may be generated by applying a hash algorithm to the second scripting limitations 6134. In embodiments, as described above, the bi-directional channel may be between a first digital asset exchange computer system 6102 and a second digital asset exchange computer system associated with the second digital asset exchange 7602-1. The second scripted account information 6106, in embodiments may be generated and/or transmitted by one or more of the first digital asset exchange computer system 6102 and the second digital asset exchange computer system. At step S6318, in embodiments, the second scripted account information 6130 may be transmitted by the first user device 6104 (and/or the second digital asset exchange computer system) via API 6107 over network 125 to the digital asset exchange computer system 6102.

After receiving the second scripted account information 6130, at step S6320, the digital asset exchange computer system 6102 may verify that the second scripted account information 6130 complies with the exchange format requirements. The digital asset exchange computer system 6102, in embodiments, may verify the first user public key 6120 is the first authorized public key, in a similar manner as described above in connection with step S6312, the description of which applying herein. The digital asset exchange computer system 6102, in embodiments, may verify the first exchange public key 6122-1 is the second authorized public key. The digital asset exchange computer system 6102, in embodiments, may verify the second exchange public key 6122-2 is a third authorized public key in a similar manner as described above in connection with step S6312, the description of which applying herein. In embodiments, as described above, the bi-directional channel may be between a first digital asset exchange computer system 6102 and a second digital asset exchange computer system associated with the second digital asset exchange 7602-1. The second digital asset exchange computer system, in embodiments, may verify the second scripted account information 6106.

The digital asset exchange computer system 6102, in embodiments, may verify the second scripting limitations 6134 include authorized instructions by comparing the third authorization instructions 6136 and the fourth authorization instructions 6138 to a list of authorized instructions stored on memory 6102-C. In embodiments, the authorized instructions, as stated above, may be code templates with blanks for specific information (e.g., the first user public key 6120, the second exchange public key 6122-2, and/or the first-time designation, to name a few). The code template(s), in embodiments, may be provided to the first customer 6202 from the digital asset exchange computer system 6102 with the non-custodial exchange key information 6140 and/or prior to the first user device 6104 generating the first scripted account information 6106. The digital asset exchange computer system 6102 may compare the code in the second scripting limitations 6134 to the authorized code template.

The digital asset exchange computer system 6102, in embodiments, may also verify the second scripted address 6118. The digital asset exchange computer system 6102, in embodiments, may verify the second scripted address 6118. In embodiments, the second scripted address 6118 may be generated by applying a hash algorithm to the second scripting limitations 6134. Similar to the description above, the hash algorithm, in embodiments, may be provided to the first customer 6202 from the digital asset exchange computer system 6102 with the non-custodial exchange key information 6140 and/or prior to the first user device 6104 generating the first scripted account information 6106. Alternatively, the hash algorithm, in embodiments, may be provided by the first customer 6202 to the digital asset exchange computer system 6102 with the first scripted account information 6106 and/or the second scripted account information 6130. In embodiments, the digital asset exchange computer system 6102 may verify the second scripted address 6118 by applying the hash algorithm to the received second scripting limitations 6134. The result of the application of the hash algorithm may be compared by the digital asset exchange computer system 6102 to the received second scripted address 6118, resulting in a determination of whether the second scripted address 6118 is verified.

In embodiments, if the second scripted account information 6130, or any information therein, is not verified, the process may continue with FIG. 63E, which is described in more detail below, the description of which applying herein.

In embodiments, the first customer 6202 may have the means to trade on the digital asset exchange 6110 (e.g., a first verified and funded scripted account and a second verified scripted account). Referring to FIG. 63C, the first customer 6202 may initiate a first trade by transmitting a first order and first transaction request. At step S6322, the digital asset exchange computer system 6102 may receive from the first user device 6104 via the API 6107, a first order to transfer a second amount of digital asset on the digital asset exchange 6110. Transfer, in embodiments, may refer to: sell, trade, and/or buy, to name a few. The second amount of digital asset, in embodiments may refer to an amount that is less than the first amount. For example, if the first amount of digital asset is 100 digital assets, then the second amount may be 1-99 digital assets. When received, the first order may be stored by the digital asset exchange computer system 6102 on memory 6102-C.

In embodiments, the first order may also include one or more of the following: (1) the first scripting limitations 6124; (2) the first scripted account information 6106; (3) the first exchange public key 6122-1; (4) the second exchange public key 6122-2; (5) the third exchange public key 6122-3; (6) the first user public key 6120; (7) the first scripted address 6116. (8) the second scripted address; (9) the first user public address associated with the first user public key 6120; (10) the second scripted account information 6130 and/or (11) the first-time designation, to name a few. The above information may be verified by the digital asset exchange computer system 6102 in a similar manner as described above in connection with steps S6312, S6316, and S6320, the descriptions of which applying herein. In embodiments, the first order may be digitally signed by the first user private key associated with the first user public key 6120.

The first customer 6202, as noted above, may also transmit a first transaction request that reflects the first order. At step S6324, the digital asset exchange computer system 6102 may receive from the first user device 6104 via the API 6107, a first transaction request. The first transaction request, may, in embodiments, account for all of the first amount of digital asset. In embodiments, to account for the first amount of digital asset in the first scripted account 6116, the first transaction request may include at least two transfer requests. The first transaction request, in embodiments, may also include one or more of the following: (1) an updated channel state; (2) a timestamp; (3) the first scripting limitations 6124; (4) the first scripted account information 6106; (5) the first exchange public key 6122-1; (6) the second exchange public key 6122-2; (7) the third exchange public key 6122-3; (8) the first user public key 6120; (9) the first mathematical solution to the first puzzle; (10) the second scripted account information 6130; and/or (11) the first-time designation, to name a few. The first transfer request of the at least two transfer requests, in embodiments, may be a transfer of the second amount of digital asset from the first scripted address 6116 to the second scripted address 6118. The second transfer request, in embodiments, may be a transfer of a third amount of digital asset to the first scripted address. The third amount may be the first amount of digital asset less the second amount of digital asset. For example, if the first amount is 100 and the second amount is 50, the third amount would equal 100–50–50 digital asset. In embodiments, the first transaction request may be digitally signed by one or more of the following: the first user private key associated with the first user public key 6120; and/or a private key associated with the first scripted address 6116, to name a few.

An updated channel state, referring to FIG. 64, may be the second channel state 6408. In embodiments, the second channel state 6408 may indicate that the first customer 6202 owns the third amount of digital asset (e.g., as shown in FIG. 64, 50 digital assets) in the custody of the first scripted address 6116. The first channel state 6406 may also indicate that the digital asset exchange computer system 6102 (or, in embodiments, the digital asset exchange 6110, or both) owns the second amount digital asset (e.g., as shown in FIG. 64, 50 digital assets). The second channel state 6408 may reflect the first order that was received by the digital asset exchange computer system 6102. In embodiments, the second channel state 6408 may have a time stamp indicating one or more of the following: (1) the time at which the first order was received; (2) the time at which the first channel state 6406 was sent; (3) the time at which the second channel state 6408 was received; (4) the first-time designation; and/or (5) the time left until the first-time designation has transpired, to name a few. Once received, the digital asset exchange computer system 6102 may store the updated channel state (second channel state 6408) in memory 6102-C, updating the current channel state. In embodiments, the first customer 6202 may transmit the updated channel state with the first order.

In embodiments, the first transaction request may include fees for trading on the digital asset exchange 6110. A trading fee, in embodiments, may be a percentage of the transaction (e.g., a percentage of the second amount), a percentage of the first amount of digital asset, and/or a flat fee per transaction, to name a few. The first transaction request, in embodiments, may include three transfer requests. The first transfer request of the three transfer requests, in embodiments, may be a transfer of the second amount of digital asset from the first scripted address 6116 to the second scripted address 6118. The second transfer request, in embodiments, may be a transfer of a third amount of digital asset to the first scripted address. The third transfer request, in embodiments, may be a transfer of a fourth amount of digital asset to a public address associated with the exchange (e.g., the first exchange public address (associated with the first exchange public key 6122-1), the second exchange public address (associated with the second exchange public key 6122-2), and/or the third exchange public address (associated with the third exchange public key 6122-3), to name a few). The fourth amount, in embodiments, may be the trading fee. For exemplary purposes, the trading fee may be 1 digital asset. Continuing the example, if the fourth amount is 1 digital asset, the second amount of digital asset is 50, and the first amount of digital asset is 100, the third amount of digital asset may be 49 (e.g., the first amount (100)−the second amount (50)−the fourth amount (1)=the third amount (49)).

In embodiments, if the first-time designation has not transpired, the digital asset exchange computer system 6102 may not send and publish the first transaction request on the blockchain 6108. In embodiments, if the first-time designation has not transpired, but a security incident has been detected or an issue arises regarding the communication between the digital asset exchange computer system 6102 and the first user device 6104, the digital asset exchange computer system 6102 may digitally sign the first transaction request and send and publish the first transaction request on the blockchain 6108 resulting in the transfers requests of the first transaction request to be executed on the blockchain 6108. However, in embodiments, if the first-time designation has transpired, the digital asset exchange computer system 6102 may digitally sign the first transaction request and send and publish the first transaction request on the blockchain 6108 resulting in the transfers requests of the first transaction request to be executed on the blockchain 6108.

In embodiments, as described above, the bi-directional channel may be between a first digital asset exchange computer system 6102 and a second digital asset exchange computer system associated with the second digital asset exchange 7602-1. The second digital asset exchange computer system, in embodiments, may generate and transmit one or more of the following: the first order, the first transaction request, and/or an updated channel state, to name a few. The transaction request may be digitally signed by a private key associated with the second digital asset exchange. In embodiments, as described above, the first order may be a batch of customer orders. The batch of customer orders, in embodiments, may reflect one or more customer's inter-exchange orders and each include one or more of the following: (a) the customer's account information associated with the first digital asset exchange; (b) the customer's account information associated with the second digital asset exchange; (c) the transaction request digitally signed by the customer (e.g., the transaction request associated with the inter-exchange order); and/or (d) one or more public addresses associated with the customer, to name a few.

Referring to FIG. 63C, after receiving the first order and first transaction request, at step S6326, the digital asset exchange computer system 6102 may verify the first transaction request. In embodiments, to verify the first transaction request, the digital asset exchange computer system 6102 may verify one or more of the following. (1) the third amount of digital asset is correct; (2) the first transaction request is signed by a private key associated with the first customer 6202; (3) the first-time designation has not transpired; and/or (4) the fourth amount of digital asset is correct, to name a few. In embodiments, where the order is a batch of customer orders and/or an inter-exchange order, the digital asset exchange computer system 6102 may verify, for each order of the batch of orders, one or more of the following: (a) the customer's account information associated with the first digital asset exchange; (b) the customer's account information associated with the second digital asset exchange; (c) the transaction request digitally signed by the customer (e.g., the transaction request associated with the inter-exchange order); and/or (d) one or more public addresses associated with the customer, to name a few.

In embodiments, the first order may also be verified by the digital asset exchange computer system 6102. In embodiments, if the first transaction request, the first order, or any information therein, is not verified, the process may continue with FIG. 63E, which is described in more detail below, the description of which applying herein.

In embodiments, the second scripted account information 6130 may be generated as a result of the first user device 6104 generating the first order and the first transaction request.

Figure 63D:
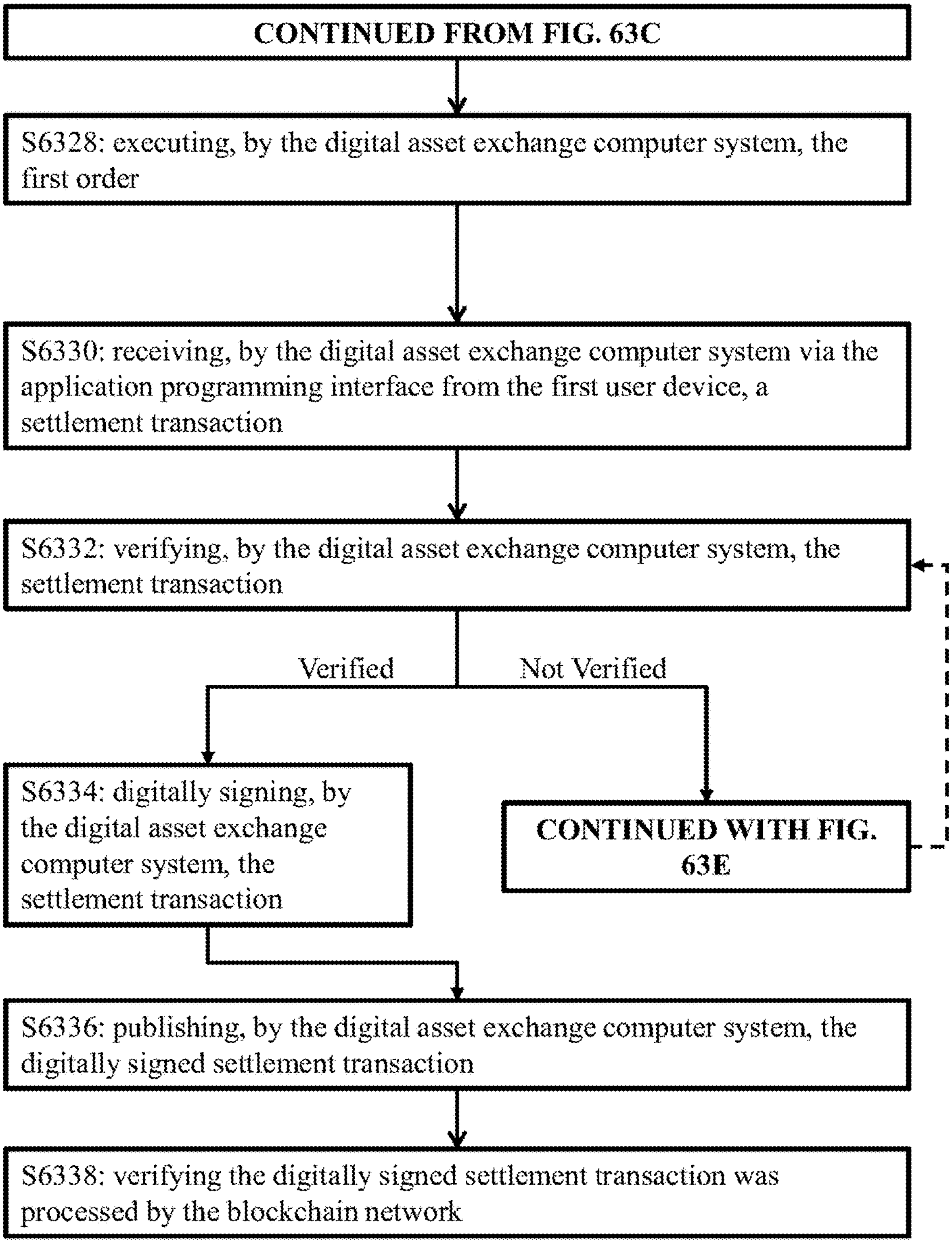
Figure 63E:
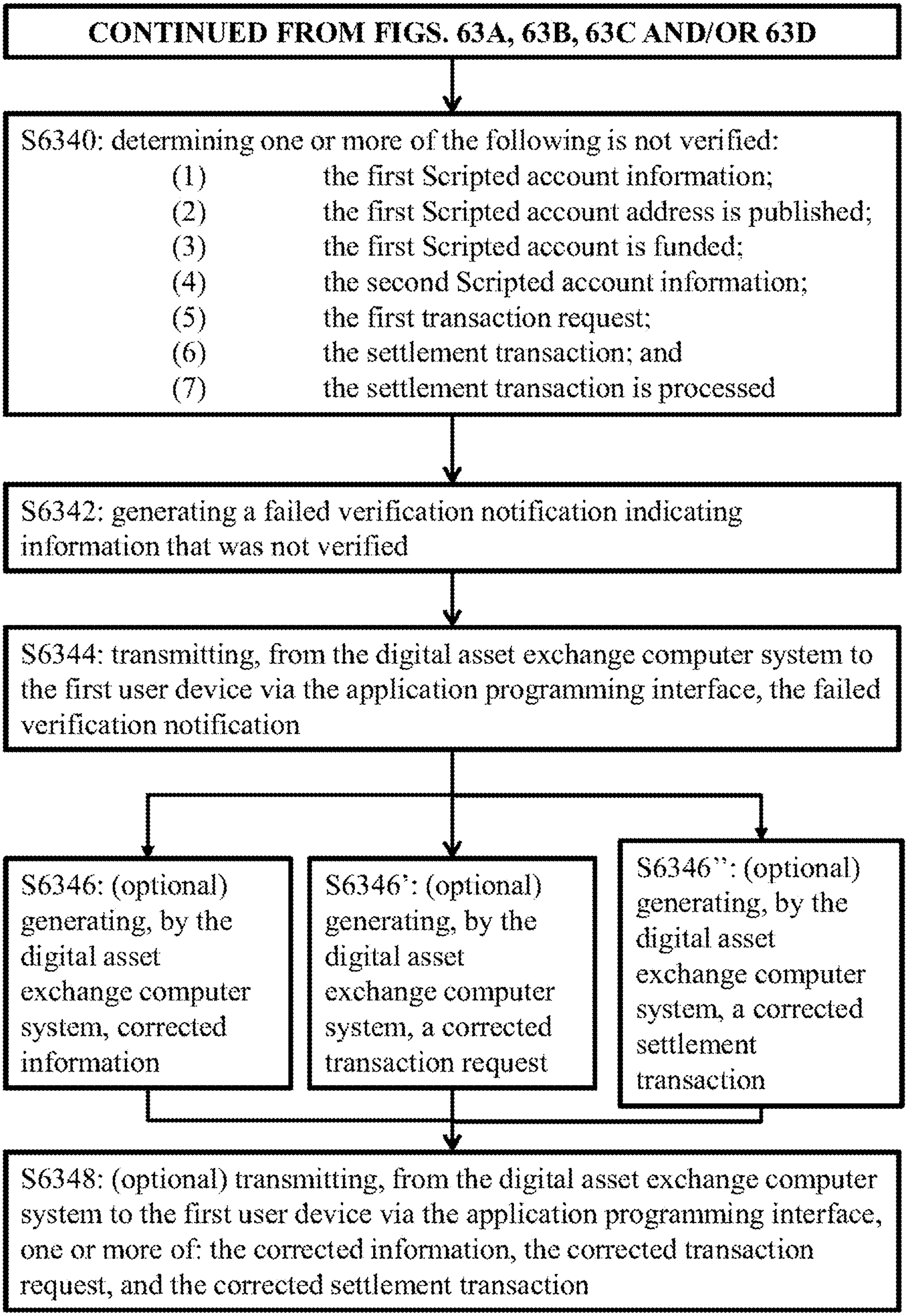
FIG. 63E is an exemplary flowchart of a process including unverified information received during the process described in connection with FIGS. 63A-63D in accordance with exemplary embodiments of the present invention.
Figure 63F:
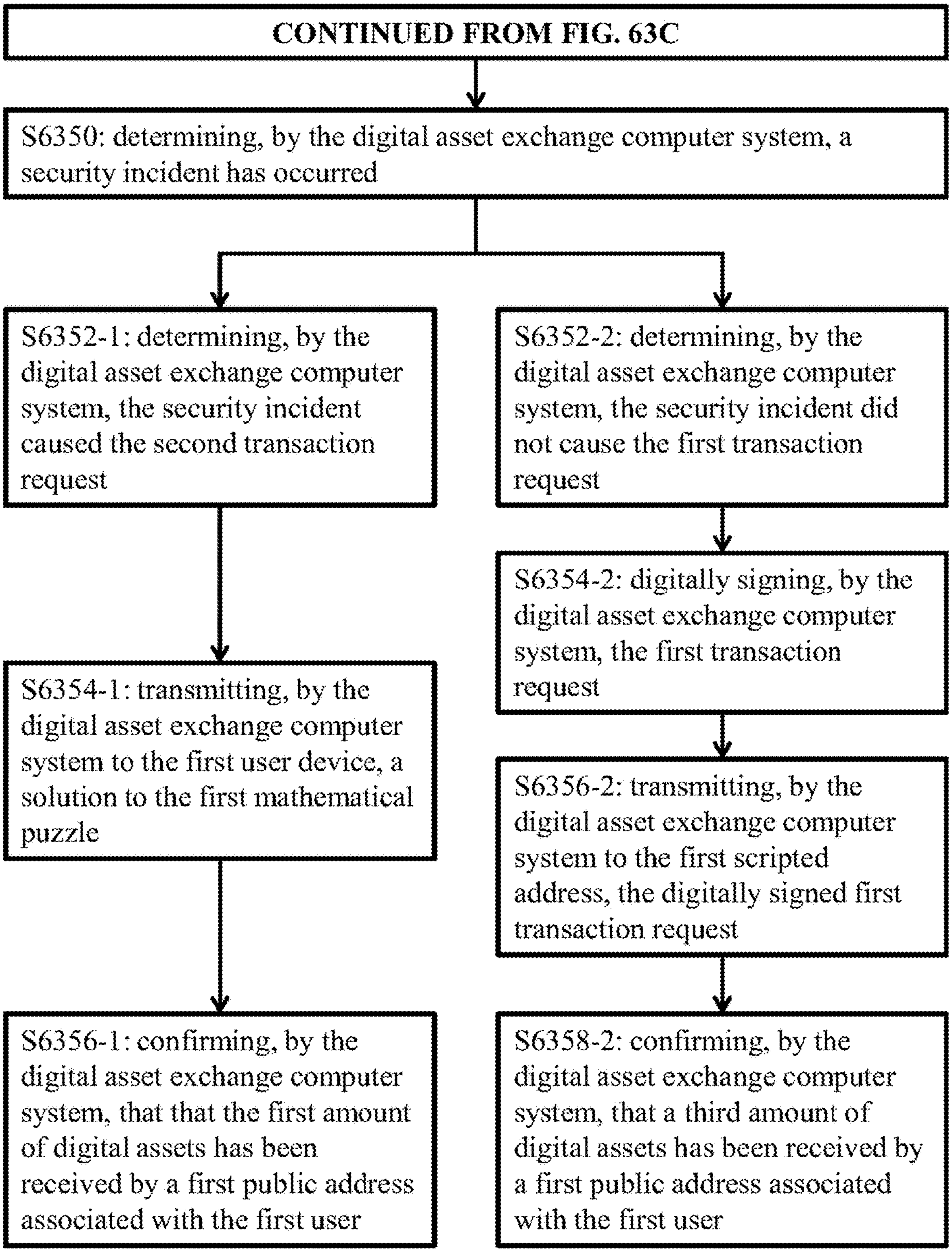
FIG. 63F is an exemplary flowchart of a process including a data breach or data incident during the process described in connection with FIGS. 63A-63D in accordance with exemplary embodiments of the present invention.

Referring to FIG. 63D, once the first transaction request is verified, the digital asset exchange computer system 6102, at step S6328, may execute the first order. In embodiments, the first order may be executed by the digital asset exchange computer system 6102 via an order ledger associated with the digital asset exchange 6110. In embodiments, even though the first transaction request is not executed, the second amount or portion(s) of the second amount of digital asset may be promised to another customer and/or to the digital asset exchange 6110. When the channel is closed, and the trading is completed (e.g., when a settlement transaction is published or when the first puzzle solution is used), in embodiments, the second amount or portion(s) of the second amount of digital asset may be transferred to another customer and/or to the digital asset exchange 6110.

During the first-time designation, the first customer 6202 may transmit one or more additional orders and/or transaction requests. The process(es) for the aforementioned additional orders and/or additional transfer requests are described in more detail below, the description of which applying herein. In embodiments, as described above, the bi-directional channel may be between a first digital asset exchange computer system 6102 and a second digital asset exchange computer system associated with the second digital asset exchange 7602-1. During the first-time designation, the second digital asset exchange and/or the first digital asset exchange may transmit one or more additional orders and/or transaction requests, the process of which may be similar to the description herein, above, and below, the descriptions of which applying herein.

As the first-time designation is expiring, in embodiments, a settlement transaction may be generated. At step S6330, the digital asset exchange computer system 6102 may receive from the first user device 6104 via the API 6107. The settlement transaction, in embodiments, may be generated by: the first user device 6104, and/or the digital asset exchange computer system 6102, to name a few. In embodiments, the first user device 6104 may generate a settlement transaction. The settlement transaction, in embodiments, may include transfers accounting for all of the digital asset that was initially funded into the first scripted address 6116 (e.g., the first amount of digital asset). The settlement transaction, in embodiments, may include two transfers. The first transfer may be a transfer of a first settlement amount from the first scripted address 6118 to a public address associated with the digital asset exchange 6110 (e.g., the first exchange public address (associated with the first exchange public key 6122-1), the second exchange public address (associated with the second exchange public key 6122-2), and/or the third exchange public address (associated with the third exchange public key 6122-3), to name a few). The first settlement amount may account for the amount of digital asset now owned by the digital asset exchange 6110. In embodiments, without fees and with only the first order/transaction request, the digital asset exchange 6110 owns the second amount of digital asset. The second transfer may be a transfer of a second settlement amount from the first scripted address 6118 to the first user public address. The second settlement amount may account for the amount of digital asset now owned by the first customer 6202. In embodiments, without fees and with only the first order/transaction request, the first customer 6202 owns the third amount of digital asset. After generating the settlement transaction, in embodiments, the settlement transaction may be digitally signed by the first user private key and transmitted to the digital asset exchange computer system 6102 via API 6107. In embodiments, the settlement transaction may include one or more of the following: (1) a timestamp; (2) the first exchange public key 6122-1; (3) the second exchange public key 6122-2; (4) the third exchange public key 6122-3; (5) the first user public key 6120; (6) the first mathematical solution to the first puzzle; (7) the first scripted account information 6106; (8) the second scripted account information 6130 and/or (9) the first-time designation, to name a few.

In embodiments, as described above, the bi-directional channel may be between a first digital asset exchange computer system 6102 and a second digital asset exchange computer system associated with the second digital asset exchange 7602-1. The settlement transaction, in embodiments, may be generated, transmitted, received, and/or verified by one or more of the first digital asset exchange computer system 6102 and/or the second digital asset exchange computer system.

In embodiments, as noted above, fees may be associated with trading or executing a settlement transaction. If fees are associated with the trading and/or settlement transaction, the amounts submitted with the settlement transaction may reflect those fees.

In embodiments, the digital asset exchange computer system 6102 may generate and transmit an unsigned settlement transaction. The unsigned settlement transaction may be similar to the settlement transaction described above, the description of which applying herein. Once generated, the digital asset exchange computer system 6102 may transmit the unsigned settlement transaction to the first user device 6104 via the API 6107. After receiving the unsigned settlement transaction, the first user device 6104 may verify that the amounts and recipient addresses are correct. If verified, the first user device 6104 may digitally sign the unsigned settlement transaction with the first user private key. Once signed, the first user device 6104 may transmit the signed settlement transaction to the digital asset exchange computer system 6102 via the API 6107. If the unsigned settlement transaction, or any information therein, is not verified, the first user device 6104 may amend the settlement transaction and digitally sign the amended settlement transaction. Once signed, the first user device 6104 may transmit the amended, signed settlement transaction to the digital asset exchange computer system 6102 via the API 6107.

After receiving the digitally signed settlement transaction, at step S6332, the digital asset exchange computer system 6102 may verify the digitally signed settlement transaction. In embodiments, to verify digitally signed settlement transaction, the digital asset exchange computer system 6102 may verify one or more of the following: (1) the first settlement amount of digital asset is correct; (2) the second settlement amount of digital asset is correct; (3) the settlement transaction is signed by a private key associated with the first customer 6202; and/or (4) the first-time designation and how much time is left, to name a few. In embodiments, if the digitally signed settlement transaction, or any information therein, is not verified, the process may continue with FIG. 63E, which is described in more detail below, the description of which applying herein.

To verify the first settlement amount and the second settlement amount, the digital asset exchange computer system 6102 may compare the aforementioned settlement amounts to the most recent channel state. Additionally, in embodiments, the digital asset exchange computer system 6102 may compare the aforementioned settlement amounts to one or more of the channel states, including one or more of the intermediary channel states. The table below is an exemplary table of information the digital asset exchange computer system 6102 may store and use as information to verify and/or generate the settlement transaction.

TABLE 2-1

| Transactions/Orders | | Channel State | |
|---|---|---|---|
| Funding Transaction | Deposit100 Digital Asset | Customer: 100 Digital Assets | Exchange: 0 Digital Assets |
| First Order | Sell 50 Digital Asset | Customer: 50 Digital Assets | Exchange: 50 Digital Assets |
| Second Order | Sell 25 Digital Asset | Customer: 25 Digital Assets | Exchange: 75 Digital Assets |
| Third Order | Sell 10 Digital Asset | Customer: 15 Digital Assets | Exchange: 85 Digital Assets |
| Final | Customer: Owns 15 Digital Asset Exchange: Owns 85 Digital Asset | | |

Once verified, at step S6334, the digital asset exchange computer system 6102 may digitally sign the settlement transaction using one or more of the following: (1) the first exchange private key; (2) the second exchange private key; and/or (3) the third exchange private key. In embodiments, as described above, the bi-directional channel may be between a first digital asset exchange computer system 6102 and a second digital asset exchange computer system associated with the second digital asset exchange 7602-1. Once the settlement transaction is verified, in embodiments, the first digital asset exchange computer system 6102 and/or the second digital asset exchange computer system may digitally sign the settlement transaction.

In embodiments, as defined by the scripting limitations and once the first-time designation has transpired, the digital asset exchange computer system 6102 may have the authority to settle the transactions, executing the digitally signed settlement transaction. To execute the digitally signed settlement transaction, the digital asset exchange computer system 6102 may publish the digitally signed settlement transaction on blockchain 6108. Referring to FIG. 62D, the digital asset exchange computer system may transmit the digitally signed settlement transaction to the blockchain 6108, which, in embodiments, may result in the publishing of the digitally signed settlement transaction on the blockchain 6108. In embodiments, as described above, the bi-directional channel may be between a first digital asset exchange computer system 6102 and a second digital asset exchange computer system associated with the second digital asset exchange 7602-1. Once the settlement transaction is verified and fully executed, in embodiments, the first digital asset exchange computer system 6102 and/or the second digital asset exchange computer system may publish (e.g., transmit) the settlement transaction on the blockchain 6108.

When the digitally signed settlement transaction is transmitted to the blockchain 6108, the first scripted address 6116 may execute the digitally signed settlement transaction. In embodiments, the execution of the digitally signed settlement transaction, may result in: the second amount of digital asset being sent to the third exchange public address and/or the third amount of digital asset being sent to the first user public address. While the amounts and destination public addresses are shown in FIG. 62D, the amounts and public addresses are determined by the verified, digitally signed settlement transaction.

Figure 62E:
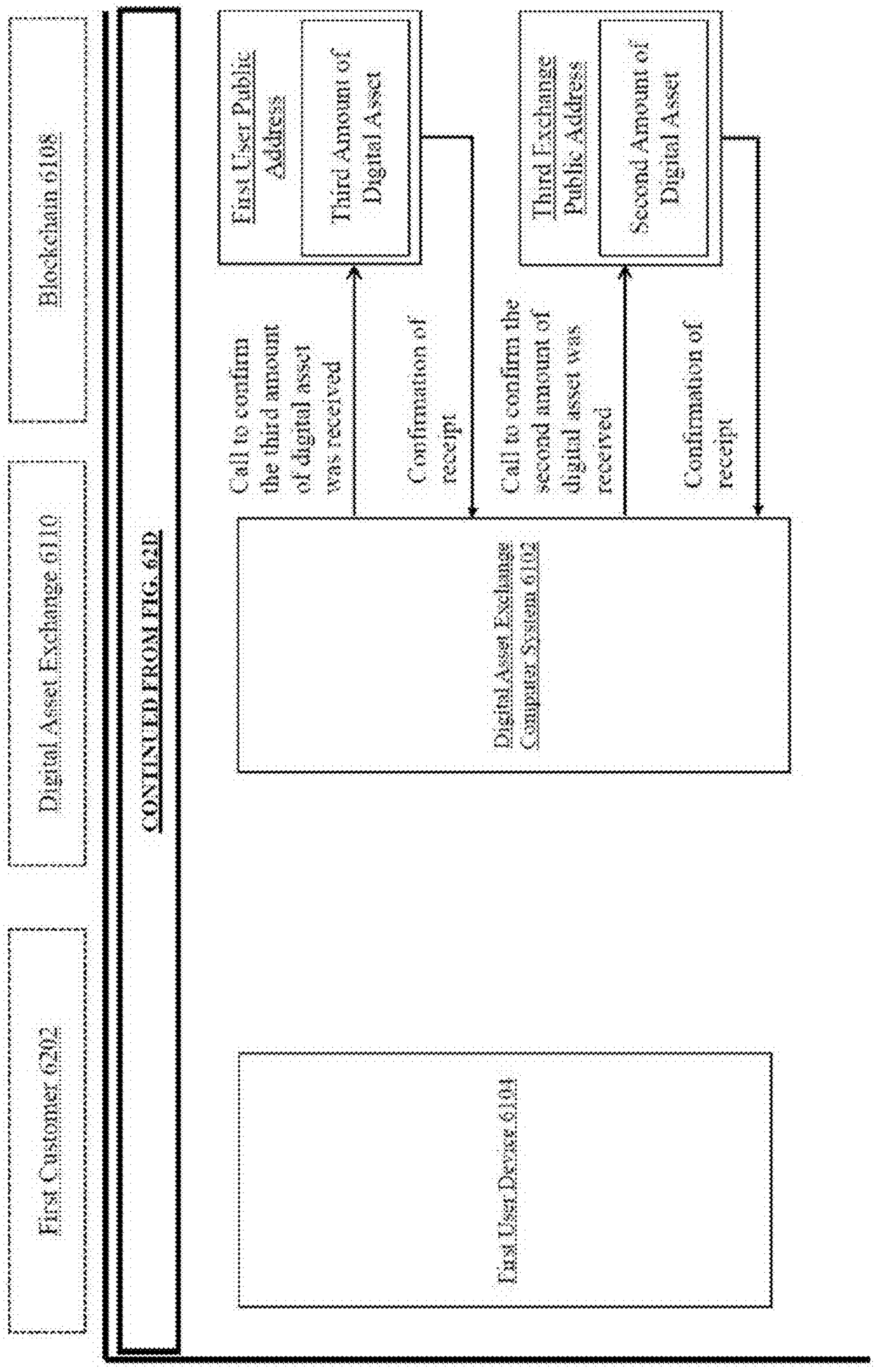

Referring back to FIG. 63D, at step S6338, the digital asset exchange computer system 6102 may verify the signed settlement transaction was processed by the blockchain 6108 network. In embodiments, the first user device 6104 may verify the signed settlement transaction was processed by the blockchain 6108 network. Referring to FIG. 62E, in embodiments, the digital asset exchange computer system 6102 may verify the signed settlement transaction was processed by sending a first call to the first user public address and a second call to the third exchange public address. The first call, in embodiments, may be to confirm that the third amount of digital asset was received by the first user public address. In response, in embodiments, the first user public address may send a return to the digital asset exchange computer system 6102 confirming the third amount of digital asset was received. The second call, in embodiments, may be to confirm that the second amount of digital asset was received by the third exchange public address. In response, in embodiments, the third exchange public address may send a return to the digital asset exchange computer system 6102 confirming the second amount of digital asset was received. In embodiments, the returns may be sent to one or more public exchange addresses associated with the digital asset exchange computer system 6102 (e.g., the first exchange public address, the second exchange public address, and/or the third exchange public address, to name a few). In embodiments, if the processing of the digitally signed settlement transaction, or any information therein, is not verified, the process may continue with FIG. 63E, which is described in more detail below, the description of which applying herein.

In embodiments, as mentioned above, the first customer 6202 may make one or more additional trades on the digital asset exchange 6110. In embodiments, prior to generating and transmitting additional orders and/or transaction requests, third scripted account information may be generated by the first user device 6104 and/or the digital asset exchange computer system 6102. In embodiments, third scripted account information may be generated only when the first user device 6104 transmits an order to purchase an amount of digital assets. In embodiments, third scripted account information may be generated when the first user device 6104 transmits any additional order.

The third scripted account information may include one or more of the following: (1) the first user public key 6120; (2) the first exchange public key 6122-1; (3) the second exchange public key 6122-2; (4) third scripting limitations; (5) third scripted address; (6) a second mathematical puzzle; and/or (7) the first-time designation, to name a few.

The second mathematical puzzle and a corresponding second mathematical solution may be generated by the digital asset exchange computer system 6102 and/or the first user device 6104 in a similar manner as described above. In embodiments, each new scripted account that is created has a corresponding mathematical puzzle and solution. In embodiments, each new scripted account may use the first mathematical puzzle and corresponding solution.

In embodiments, the third scripting limitations may be scripting limitations associated with a third scripted account which may also include authorization instructions (e.g., fifth authorization instructions and sixth authorization instructions). Similar to the above authorization instructions, the fifth authorization instructions and the sixth authorization instructions may define scenarios where transaction requests received by the third scripted address are authorized. For example, the authorization instructions may authorize transactions only if either: (1) the transaction request is signed by a private key associated with the digital asset exchange and is received after the predetermined amount of time has transpired (the fifth authorization instructions); or (2) the transaction request is signed by a private key associated with the customer and includes the second mathematical solution (the sixth authorization instructions). In embodiments, the third scripted account information may be transmitted by the first user device 6104 via API 6107 over network 125 to the digital asset exchange computer system 6102.

After receiving the third scripted account information, the digital asset exchange computer system 6102 may verify that the third scripted account information complies with the exchange format requirements. The digital asset exchange computer system 6102, in embodiments, may verify the first user public key 6120 is the first authorized public key, in a similar manner as described above in connection with step S6312, the description of which applying herein. The digital asset exchange computer system 6102, in embodiments, may verify the first exchange public key 6122-1 is the second authorized public key. The digital asset exchange computer system 6102, in embodiments, may verify the second exchange public key 6122-2 is a third authorized public key in a similar manner as described above in connection with step S6312, the description of which applying herein.

The digital asset exchange computer system 6102, in embodiments, may verify the third scripting limitations include authorized instructions by comparing the fifth authorization instructions and the sixth authorization instructions to a list of authorized instructions stored on memory 6102-C. In embodiments, the authorized instructions, as stated above, may be code templates with blanks for specific information (e.g., the first user public key 6120, the second exchange public key 6122-2, and/or the first-time designation, to name a few). The code template(s), in embodiments, may be provided to the first customer 6202 from the digital asset exchange computer system 6102 with the non-custodial exchange key information 6140 and/or prior to the first user device 6104 generating the first scripted account information 6106. The digital asset exchange computer system 6102 may compare the code in the third scripting limitations to the authorized code template.

The digital asset exchange computer system 6102, in embodiments, may also verify a third scripted address associated with the third scripted account and/or the third scripted account information. The digital asset exchange computer system 6102, in embodiments, may verify the third scripted address. In embodiments, the third scripted address may be generated by applying a hash algorithm to the third scripting limitations. Similar to the description above, the hash algorithm, in embodiments, may be provided to the first customer 6202 from the digital asset exchange computer system 6102 with the non-custodial exchange key information 6140 and/or prior to the first user device 6104 generating the first scripted account information 6106. Alternatively, the hash algorithm, in embodiments, may be provided by the first customer 6202 to the digital asset exchange computer system 6102 with the first scripted account information 6106, the second scripted account information 6130, and/or the third scripted account information. In embodiments, the digital asset exchange computer system 6102 may verify the third scripted address by applying the hash algorithm to the received third scripting limitations. The result of the application of the hash algorithm may be compared by the digital asset exchange computer system 6102 to the received third scripted address, resulting in a determination of whether the third scripted address is verified. In embodiments, if the third scripted account information, or any information therein, is not verified, the process may continue with FIG. 63E, which is described in more detail below, the description of which applying herein.

In embodiments, the first customer 6202 may initiate a second trade by transmitting a second order and second transaction request before the first-time designation has transpired. The second order, in embodiments, the second order may be to sell a sixth amount of digital asset. In embodiments, the second order may be to buy a sixth amount of digital asset. The sixth amount of digital asset, in embodiments may refer to an amount that is less than the third amount. In embodiments, the sixth amount may refer to an amount that is less than the second amount. When received, the second order may be stored by the digital asset exchange computer system 6102 on memory 6102-C.

In embodiments, the second order may also include one or more of the following: (1) the first exchange public key 6122-1; (2) the second exchange public key 6122-2; (3) the second scripting limitations 6134; (4) the second scripted account information 6130; (5) the third exchange public key 6122-3; (6) the first user public key 6120; (7) the first scripted address 6116; (8) the second scripted address; (9) the first user public address associated with the first user public key 6120; (10) the second scripted account information 6130 and/or (11) the first-time designation, to name a few. The above information may be verified by the digital asset exchange computer system 6102 in a similar manner as described above in connection with steps S6312, S6316, and S6320, the descriptions of which applying herein. In embodiments, the second order may be digitally signed by the first user private key associated with the first user public key 6120.

The first customer 6202, as noted above, may also transmit a second transaction request that reflects the second order via the API 6107. The second transaction request in embodiments, may account for all of the first amount of digital asset. In embodiments, to account for the first amount of digital asset in the first scripted account 6116, the second transaction request may include at least three transfer requests. The second transaction request, in embodiments, may also include one or more of the following: (1) an updated channel state; (2) a timestamp; (3) the second scripting limitations 6134; (4) the second scripted account information 6130; (5) the first exchange public key 6122-1; (6) the second exchange public key 6122-2; (7) the third exchange public key 6122-3; (8) the first user public key 6120; (9) the second mathematical solution to the second puzzle; (10) the third scripted account information; (11) the third scripting limitations; and/or (12) the first-time designation, to name a few. In embodiments, if the second order is to sell the sixth amount of digital asset, the first transfer request of the at least three transfer requests, in embodiments, may be a transfer of the sixth amount of digital asset from the first scripted address 6116 to one or more of the following: the second scripted address 6118 and/or the third scripted address, to name a few. In embodiments, if the second order is to buy the sixth amount of digital asset, the first transfer request of the at least three transfer requests, in embodiments, may be a transfer of the sixth amount of digital asset from the second scripted address 6118 to one or more of the following: the first scripted address 6116 and/or the third scripted address, to name a few.

The second transfer request, in embodiments, may be a transfer of a seventh amount of digital asset to the second scripted address 6118. The seventh amount of digital asset, in embodiments, may be the amount of digital assets that is not transferred by the second order that is still in the second scripted address 6118. For example, if the second order is to sell the sixth amount of digital asset, the seventh amount of digital asset may be the second amount of digital asset. As another example, if the second order is to buy the sixth amount of digital asset, the seventh amount of digital asset may be the second amount of digital asset less the sixth amount of digital asset. The third transfer request, in embodiments, may be a transfer of an eighth amount of digital asset to the first scripted address 6116. The eighth amount of digital asset, in embodiments, may be the amount of digital assets that is not transferred by the second order that is still in the first scripted address 6116. For example, if the second order is to sell the sixth amount of digital asset, the eighth amount of digital asset may be the third amount of digital asset less the sixth amount of digital asset. As another example, if the second order is to buy the sixth amount of digital asset, the eighth amount of digital asset may be the third amount of digital asset.

In embodiments, the second transaction request may be digitally signed by one or more of the following: the first user private key associated with the first user public key 6120; a private key associated with the first scripted address 6116; a private key associated with the second scripted address 6118; and/or a private key associated with the third scripted address, to name a few.

An updated channel state, referring to FIG. 64, may be the third channel state 6410. In embodiments, the third channel state 6410 may indicate that the first customer 6202 owns the eighth amount of digital asset (e.g., as shown in FIG. 64, 25 digital assets) in the custody of the first scripted address 6116. The first channel state 6406 may also indicate that the digital asset exchange computer system 6102 (or, in embodiments, the digital asset exchange 6110, or both) owns the sixth amount of digital asset and the seventh amount digital asset (e.g., as shown in FIG. 64, 75 digital assets). The third channel state 6410 may reflect a second first order that was received by the digital asset exchange computer system 6102. As shown in FIG. 64, the second order may be for the first customer 6202 to buy 25 second digital assets in exchange for 25 first digital assets. While the second order is to buy a different type of digital asset, from the perspective of the first scripted address 6116 and the digital asset exchange 6110, in embodiments, the first customer 6202 is selling the first digital asset in exchange for the second digital asset. In embodiments, the third channel state 6410 may have a time stamp indicating one or more of the following: (1) the time at which the second order was received; (2) the time at which the first channel state 6406 was sent; (3) the time at which the second channel state 6408 was received; (4) the time at which the third channel state 6410 was received; (5) the first-time designation; and/or (6) the time left until the first-time designation has transpired, to name a few. Once received, the digital asset exchange computer system 6102 may store the updated channel state (third channel state 6410) in memory 6102-C, updating the current channel state. In embodiments, the first customer 6202 may transmit the updated channel state with the second order.

In embodiments, the second transaction request may include fees for trading on the digital asset exchange 6110. The fees, as described herein, may be similar to the transaction fees described above, the description of which applying herein.

In embodiments, if the first-time designation has not transpired, the digital asset exchange computer system 6102 may not send and publish the second transaction request on the blockchain 6108. In embodiments, if the first-time designation has not transpired, but a security incident has been detected or an issue arises regarding the communication between the digital asset exchange computer system 6102 and the first user device 6104, the digital asset exchange computer system 6102 may digitally sign the second transaction request and send and publish the second transaction request on the blockchain 6108 resulting in the transfers requests of the second transaction request to be executed on the blockchain 6108. However, in embodiments, if the first-time designation has transpired, the digital asset exchange computer system 6102 may digitally sign the second transaction request and send and publish the first transaction request on the blockchain 6108 resulting in the transfers requests of the second transaction request to be executed on the blockchain 6108.

After receiving the second order and second transaction request, may verify the second transaction request. In embodiments, to verify the second transaction request, the digital asset exchange computer system 6102 may verify one or more of the following: (1) the sixth amount of digital asset is correct; (2) the seventh amount of digital asset is correct; (3) the eighth amount of digital asset is correct; (4) the second transaction request is signed by a private key associated with the first customer 6202; and/or (5) the first-time designation has not transpired, to name a few. In embodiments, the second order may also be verified by the digital asset exchange computer system 6102. In embodiments, if the second transaction request, the second order, or any information therein, is not verified, the process may continue with FIG. 63E, which is described in more detail below, the description of which applying herein. In embodiments, the third scripted account information may be generated as a result of the first user device 6104 generating the second order and the second transaction request.

Once the second transaction request is verified, the digital asset exchange computer system 6102 may execute the second order. The execution of the second order may be similar to the execution of the first order described above, the description of which applying herein.

The first customer 6202, in embodiments, may continue to place additional orders and transaction requests during the first-time designation. For example, the first customer 6202 may transmit a third order and transaction request, a fourth order and transaction request . . . an Nth order and transaction request. Each order and/or request, in embodiments, may be digitally signed, received, verified, executed, and include similar information as mentioned above with respect to the first order/transaction request and/or the second order/transaction request, the description of which applying herein.

In embodiments, the above mentioned generated and digitally signed settlement transaction may account for the one or more transactions that occur during the first-time designation. For example, if the second order is to buy 10 digital asset, the settlement transaction may result in 60 digital asset being transferred to the first user public address and 40 digital asset being transferred to a public address associated with the digital asset exchange 6110.

As mentioned above, in embodiments, referring to FIG. 63D, at step S6340, the digital asset exchange computer system 6102 and/or the first user device 6104 may determine that one or more of the following are not verified: (1) the first scripted account information 6124; (2) the publishing of the first scripted address 6116; (3) the funding of the first scripted address 6116; (4) the second scripted account information 6130; (5) the second scripted address 6118; (6) the first order; (7) the first transaction request; (8) the second order . . . the Nth order; (9) the second transaction request . . . the Nth transaction request; (10) the settlement transaction; and/or (11) the processing of the settlement transaction, to name a few.

In embodiments, as a result of determining that the above information was not verified, at step S6342, a failed verification notification may be generated. The failed verification notification, in embodiments, may be generated by the digital asset exchange computer system 6102 and/or the first user device 6104. The failed verification notification may indicate one or more of the following: (1) the information that was not verified; (2) whether the first customer may continue trading; and/or (3) options to cure the verification issue, to name a few. In embodiments, the failed verification may be fatal to the first customer 6202 continuing to trade on the digital asset exchange via the API 6107 and using the first scripted address 6116. For example, received authorization instructions may include a bug that causes the digital asset exchange computer system 6102 to determine that the safest action would be to close the channel and cancel the first customer's 6202 trading session. If the digital asset exchange computer system 6102 determines to cancel the trading session and close the channel, the failed verification notification may also include a puzzle solution that corresponds to the verification issue. For example, if the verification issue is with a second transaction request, and the issue is fatal to trading, the digital asset exchange computer system 6102 may include the first puzzle solution to allow the first customer 6202 to withdraw the first customer's 6202 digital assets. In embodiments, the digital asset exchange computer system 6102 may determine how to solve the verification issue. For example, the first customer 6202 may have forgotten to put in an amount of digital asset in the order and the failed verification notification may indicate as such. As another example, the first customer 6202 may have input an amount that is unavailable. Unavailable, for example, may be if the first amount of digital asset is 100 and the first order is to sell 50,000 digital asset.

Once generated, at step S6344, the digital asset exchange computer system 6102 may transmit the failed verification notification to the first user device 6104 via the API 6107. In embodiments, the failed verification notification may include executable machine-readable instructions that cause the failed verification notification to be displayed on a display screen of the first user device 6104 upon receipt of the failed verification notification.

In embodiments, the digital asset exchange computer system may generate corrected information, transaction request, order, and/or settlement agreement, to name a few (steps S6346, S6346', and S6346"). For example, if the first scripted account information 6106 failed the verification process, the digital asset exchange computer system 6102 may generate corrected first scripted account information. As another example, if the first transaction request failed the verification process, the digital asset exchange computer system 6102 may generate a corrected first transaction request. As another example, if the first order failed the verification process, the digital asset exchange computer system 6102 may generate a corrected first order. As yet another example, if the settlement transaction request failed the verification process, the digital asset exchange computer system 6102 may generate a corrected settlement transaction request.

Once the corrected information, transaction request, order, and/or settlement agreement is generated, at step S6348, the digital asset exchange computer system 6102 may transmit the corrected information, transaction request, order, and/or settlement agreement to the first user device 6104 via the API 6107. In embodiments, the corrected information, transaction request, order, and/or settlement agreement may be transmitted with an option for the first customer 6202 to cancel the trading session and close the channel. If the first customer 6202, selects the cancel/close option, the first user device 6104 may send a message to the digital asset exchange computer system 6102, indicating the first customer's 6202 intention to cancel/close. In embodiments, in response to receiving the message, the digital asset exchange computer system 6102 may cancel the trading session, close the channel, and generate a transaction request and/or message containing the first puzzle solution. The generated transaction request and/or message may also include an updated channel state, indicating how many digital assets the first customer 6202 owns in the first scripted address 6116. Once generated, the transaction request and/or message may be transmitted to the first user device 6104, enabling the first customer 6202 to withdraw the digital assets owned by the first customer 6202.

Once the corrected information, transaction request, order, and/or settlement agreement is transmitted to the first user device 6104, the process may continue with the verifying step that the information, transaction request, order, and/or settlement agreement previously failed.

In embodiments, the first customer 6202 may transfer all of the digital assets that were initially deposited into the first scripted address 6116 (e.g., the first amount of digital asset). For example, the first amount of digital asset may be 100 BITCOIN and the first customer 6202 may transmit a first, second, third, and fourth order/transaction request. Continuing the example, the first order may be to sell 50 BITCOIN, the second order may be to sell 25 BITCOIN, the third order may be to buy 10 ETHER with 10 BITCOIN, and the fourth order may be to sell 15 BITCOIN. The channel state, after each of the aforementioned orders and/or transactions are verified, in this example, may indicate that the first customer 6202 owns 0 digital asset and the digital asset exchange 6110 owns 100 digital asset.

In embodiments, the first customer 6202 may transfer an additional amount of digital asset to the first scripted account 6116. In embodiments, the first customer 6202 may only transfer additional assets to the first scripted account 6116 during the first-time designation. The transfer of an additional amount of digital asset to the first scripted account 6116 may be similar to the transfer of the first amount of digital asset to the first scripted address 6116 described above in connection with FIGS. 62B and 63B, the description of which applying herein.

In embodiments, the first customer 6202 may deposit multiple types of digital assets into the first scripted account 6116. For example, the first amount may be 100 digital assets. Of the first amount, 50 may be BITCOIN, 25 may be ETHER, 10 may be LITECOIN, and 15 may be GEMINI DOLLAR.

In embodiments, the cooperation between the digital asset exchange 6110 and the first customer 6202 may breakdown. For example, the first user device 6104 may stop responding to messages from the digital asset exchange computer system 6102. As another example, the first customer 6202 and the digital asset exchange 6110 may not agree on the amounts of digital asset in the settlement transaction. A breakdown in cooperation may result in the digital asset exchange computer system 6102 forcing a settlement by broadcasting the second scripted account and the digitally signed transaction requests. In embodiments, broadcasting the second scripted account and the digitally signed transaction may result in the execution of the digitally signed transactions.

The steps of the processes associated with FIGS. 62A-E and FIGS. 63A-E may be rearranged or omitted.

FIG. 61A is an exemplary block diagram illustrating a digital asset exchange computer system 6102 communicating with a first user device 6104 via an API 6107 in accordance with exemplary embodiments of the present invention. The system shown in connection with FIG. 61A provides a technical solution to the technical problem of securing digital assets in the context of digital asset exchange trading. The system illustrated in FIG. 61A may, in embodiments, include a digital asset exchange computer system 6102 operatively connected to a digital asset exchange 6110. In embodiments, the digital asset exchange computer system 6102 may communicate with the digital asset exchange 6110 via network 125. The digital asset exchange 6110, as described herein, may be similar to the digital asset exchange described in connection with the Centralized Digital Asset Exchange disclosure above, the description of which applying herein.

The digital asset exchange computer system 6102, in embodiments, may be configured to communicate with one or more user devices via one or more channels for the purposes of trading one or more digital assets on the digital asset exchange 6110. This process is illustrated in FIGS. 62A-62E and FIGS. 63A-63E.

In embodiments, a method for non-custodial trading includes: (a) connecting, using an application programming interface associated with an exchange computer system associated with a digital asset exchange and a first user device associated with a first customer of the digital asset exchange; (b) generating, by the exchange computer system, a first mathematical puzzle and a corresponding first mathematical solution associated with the first mathematical puzzle; (c) providing, by the exchange computer system, non-custodial exchange key information comprising: (i) a first exchange public key associated with the digital asset exchange, wherein the first exchange public key corresponds to a first exchange private key; wherein a first key pair comprises the first exchange public key and the first exchange private key, and wherein the first key pair corresponds to a first exchange public address associated with a digital asset; (ii) a second exchange public key associated with the digital asset exchange, wherein the second exchange public key corresponds to a second exchange private key; wherein a second key pair comprises the second exchange public key and the second exchange private key, and wherein the second key pair corresponds to a second exchange public address; and (iii) a third exchange public key associated with the digital asset exchange, wherein the third exchange public key corresponds to a third exchange private key; wherein a third key pair comprises the third exchange public key and the third exchange private key, and wherein the third key pair corresponds to a third exchange public address; wherein the digital asset is maintained on a distributed public transaction ledger maintained in the form of a blockchain by a plurality of geographically distributed computer systems in a peer-to-peer network in the form of a blockchain network; (d) transmitting, from the exchange computer system to the first user device via the application programming interface, the first mathematical puzzle and the non-custodial exchange key information; (e) receiving, via the application programming interface from the first user device by the exchange computer system, first scripted account information for the digital asset associated with the blockchain, wherein the first scripted account information corresponds to a first scripted account and a corresponding first scripted address for use by the blockchain, wherein the first scripted account information comprises a customer public key, the first exchange public key and first scripting limitations, wherein the customer public key is associated with a customer private key, wherein a fourth key pair comprises the customer public key and the customer private key, wherein the fourth key pair corresponds to a first user public address associated with the digital asset, wherein the first scripting limitations include first authorization instructions which authorize transactions received from the first user public address and signed by both the customer private key and the exchange private key, wherein the first scripting limitations include second authorization instructions which authorize transactions after a first-time designation has transpired, which are signed by the customer private key, (f) verifying, by the exchange computer system, the first scripted account information complies with exchange format requirements, including verifying: (1) the customer public key is a first authorized public key associated with the first customer; (2) the first exchange public key is a second authorized public key; (3) the first authorization instructions and the second authorization instructions are each authorized instructions; (g) receiving, via the application programming interface from the first user device by the exchange computer system, an initial channel state indicating that a first amount of digital asset has been transferred via the blockchain to the first scripted address; (h) confirming, by the exchange computer system, that the first scripted address has been published on the blockchain, and that the first amount of digital asset has been received by the first scripted address; (i) receiving, by the exchange computer system from the first user device via the application programming interface, second scripted account information for the digital asset associated with the blockchain, wherein the second scripted account information corresponds to a second scripted address for use by the blockchain, wherein the second scripted account information comprises the customer public key, the second exchange public key and second scripting limitations, wherein the second scripting limitations include third authorization instructions which authorize transactions after the first-time designation has transpired, which are signed by the exchange private key, wherein the second scripting limitations include fourth authorization instructions which authorize transactions, signed by the customer private key, and include the first mathematical solution; (j) verifying, by the exchange computer system, that the second scripting limitations comply with exchange format requirements, including verifying: (1) the customer public key is the first authorized public key associated with the first customer; (2) the first exchange public key is the second authorized public key; (3) the third authorization instructions and the fourth authorization instructions are each authorized instructions; (k) receiving, by the exchange computer system from the first user device via the application programming interface, a first order to sell a second amount of digital asset on the digital asset exchange on behalf of the first customer, wherein the second amount of digital asset is less than the first amount of digital asset; (1) receiving, by the exchange computer system from the first user device via the application programming interface, a first transaction request digitally signed by the customer private key and associated with a first transaction wherein the first transaction comprises: (i) a first transfer of the second amount of digital asset from the first scripted address to the second scripted address; and (ii) a second transfer of a third amount of digital asset from the first scripted address to the first scripted address, wherein the third amount of digital asset is the first amount of digital asset less the second amount of digital asset; (m) verifying, by the exchange computer system, the first transaction request, including verifying: (i) the first amount plus the second amount equals the third amount; and (ii) the first transaction request is digitally signed by a private key that corresponds with the first customer public key; (n) executing, by the exchange computer system, the first order; (o) receiving, by the exchange computer system from the first user device via the application programming interface, a settlement transaction digitally signed by the customer private key and associated with a settlement transaction wherein the settlement transaction comprises: (i) a third transfer of a first settlement amount of digital asset from the first scripted address to the third exchange public address, wherein the first settlement amount is a fourth amount of digital asset, and wherein the fourth amount is either less than the second amount of digital asset or equal to the second amount of digital asset; and (ii) a fourth transfer of a second settlement amount of digital asset from the first scripted address to the first user public address, wherein the second settlement amount is a fifth amount of digital asset, and wherein the fifth amount is less than or equal to the second amount of digital asset subtracted from the first amount of digital asset; (p) verifying, by the exchange computer system, the settlement transaction, including verifying: (i) the first settlement amount is the fourth amount of digital asset, and (ii) the second settlement amount is the fifth amount of digital asset; (q) digitally signing, by the exchange computer system with the first exchange private key, the settlement transaction to generate a digitally signed settlement transaction; (r) publishing, by the exchange computer system to the blockchain, the digitally signed settlement transaction; and (s) verifying, by the exchange computer system, the digitally signed settlement transaction was processed by the blockchain network.

In embodiments the initial channel state further comprises a timestamp indicating when the first amount of digital asset was transferred to the first scripted address.

In embodiments the first transaction request further comprises a timestamp indicating when the first order was received.

In embodiments the method further comprises, between step (n) and step (o), the following steps: (t) receiving by the exchange computer system from the first user device via the application programming interface, a second order to transfer a sixth amount of digital asset on the digital asset exchange, wherein the sixth amount of digital asset is either less than the third amount of digital asset or equal to the third amount of digital asset; (u) receiving, by the exchange computer system from the first user device via the application programming interface, a second transaction request digitally signed by the customer private key and associated with a second transaction wherein the second transaction comprises: (i) a fifth transfer of the sixth amount of digital asset and the second amount of digital asset from the first scripted address to the second scripted address, wherein the sixth amount of digital asset is less than the third amount of digital asset; (ii) a sixth transfer of a seventh amount of digital asset from the first scripted address to the first scripted address, wherein the seventh amount of digital asset is the third amount of digital asset less the sixth amount of digital asset, (v) verifying, by the exchange computer system, the second transaction request, including verifying: (i) the sixth amount is less than the third amount of digital asset; (ii) the seventh amount of digital asset is the third amount less the sixth amount; and (ii) the first transaction request is digitally signed by a private key that corresponds with the first customer public key; and (w) executing, by the exchange computer system, the second order, wherein the first settlement amount is the sixth amount of digital asset, wherein the second settlement amount is the seventh amount of digital asset, and wherein the exchange computer system verifies: (iii) the first settlement amount is equal to the sixth amount of digital asset; and (iv) the second settlement amount is the seventh amount of digital asset. In embodiments, the initial channel state further comprises a first timestamp indicating when the first amount of digital asset was transferred to the first scripted address, the first transaction request further comprises a second timestamp indicating when the first order was received, and the second transaction request further comprises a third timestamp indicating when the second order was received.

In embodiments the method further comprises, between step (n) and step (o), the following steps: (t) receiving, via the application programming interface from the first user device by the exchange computer system, third scripted account information for the digital asset associated with the blockchain, wherein the third scripted account information corresponds to a third scripted account and a corresponding third scripted account address for use by the blockchain, wherein the third scripted account information comprises the customer public key, the first exchange public key and third scripting limitations, wherein the third scripting limitations include fifth authorization instructions which authorize transactions after the first-time designation has transpired, which are signed by the exchange private key, wherein the third scripting limitations include sixth authorization instructions which authorize transactions, signed by the customer private key, and include a second mathematical solution; (u) generating, by the exchange computer system, a second mathematical puzzle and the second mathematical solution associated with the second mathematical puzzle; (v) verifying, by the exchange computer system, the third scripted account information complies with exchange format requirements, including verifying: (1) the customer public key is the first authorized public key associated with the first customer; (2) the first exchange public key is the second authorized public key; (3) the fifth authorization instructions and the sixth authorization instructions are each authorized instructions; (v) receiving by the exchange computer system from the first user device via the application programming interface, a second order to receive a fourth amount of digital asset on the digital asset exchange; (w) receiving, by the exchange computer system from the first user device via the application programming interface, a second transaction request digitally signed by the customer private key and associated with a second transaction wherein the second transaction comprises: (i) a fifth transfer of the sixth amount of digital asset from the second scripted address to the third scripted address, wherein the sixth amount of digital asset is either less than the second amount of digital asset or equal to the second amount of digital asset; (ii) a sixth transfer of a seventh amount of digital asset from the first scripted address to the first scripted address, wherein the seventh amount of digital asset is the first amount of digital asset less the second amount of digital asset; and (iii) a seventh transfer of an eighth amount of digital asset from the second scripted address to the second scripted address, wherein the eighth amount of digital asset is the second amount of digital asset less the sixth amount of digital asset, (x) verifying, by the exchange computer system, the second transaction request, including verifying: (i) the sixth amount of digital asset is either less than the second amount of digital asset or equal to the second amount of digital asset (ii) the seventh amount of digital asset is the third amount of digital asset; and (ii) the second transaction request is digitally signed by a private key that corresponds with the first customer public key; and (y) executing, by the exchange computer system, the second order, wherein the settlement transaction further comprises: (iii) an eighth transfer of a third settlement amount of digital asset from the third scripted address to the first user public address, wherein the third settlement amount is the sixth amount of digital asset, wherein the first settlement amount is eighth amount, wherein the second settlement amount is the seventh amount, and wherein the exchange computer system verifies: (iii) the first settlement amount is equal to the eighth amount of digital asset; (iv) the second settlement amount is the seventh amount of digital asset; and (v) the third settlement amount is the sixth amount of digital asset. In embodiments the initial channel state further comprises a first timestamp indicating when the first amount of digital asset was transferred to the first scripted address, the first transaction request further comprises a second timestamp indicating when the first order was received, and the second transaction request further comprises a third timestamp indicating when the second order was received.

In embodiments the method further comprises, between step (n) and step (o), the following steps: (t) receiving, via the application programming interface from the first user device by the exchange computer system, third scripted account information for the digital asset associated with the blockchain, wherein the third scripted account information corresponds to a third scripted account and a corresponding third scripted address for use by the blockchain, wherein the third scripted account information comprises the customer public key, the first exchange public key and third scripting limitations, wherein the third scripting limitations include fifth authorization instructions which authorize transactions after the first-time designation has transpired, which are signed by the exchange private key, wherein the third scripting limitations include sixth authorization instructions which authorize transactions, signed by the customer private key, and include a second mathematical solution; (u) generating, by the exchange computer system, a second mathematical puzzle and the second mathematical solution associated with the second mathematical puzzle; (v) verifying, by the exchange computer system, the third scripted account information complies with exchange format requirements, including verifying: (1) the customer public key is the first authorized public key associated with the first customer; (2) the first exchange public key is the second authorized public key; (3) the fifth authorization instructions and the sixth authorization instructions are each authorized instructions; (w) receiving by the exchange computer system from the first user device via the application programming interface, a second order to transfer a sixth amount of digital asset on the digital asset exchange, wherein the sixth amount of digital asset is either less than the third amount of digital asset or equal to the third amount of digital asset; (x) receiving, by the exchange computer system from the first user device via the application programming interface, a second transaction request digitally signed by the customer private key and associated with a second transaction wherein the second transaction comprises: (i) a fifth transfer of the sixth amount of digital asset from the first scripted address to the third scripted address; (ii) a sixth transfer of a seventh amount of digital asset from the first scripted address to the first scripted address, wherein the seventh amount of digital asset is the third amount of digital asset less the sixth amount of digital asset, (y) verifying, by the exchange computer system, the second transaction request, including verifying: (i) the sixth amount of digital asset is either less than the third amount of digital asset or equal to the third amount of digital asset; (ii) the seventh amount of digital asset is the third amount of digital asset less the sixth amount of digital asset; and (ii) the second transaction request is digitally signed by a private key that corresponds with the first customer public key; and (z) executing, by the exchange computer system, the second order, wherein the settlement transaction further comprises: (iii) a seventh transfer of a third settlement amount of digital asset from the third scripted address to the third exchange public address, wherein the third settlement amount is the sixth amount of digital asset, wherein the first settlement amount is eighth amount, wherein the second settlement amount is the seventh amount, and wherein the exchange computer system verifies: (iii) the first settlement amount is equal to the sixth amount of digital asset; and (iv) the second settlement amount is the seventh amount of digital asset. In embodiments the sixth amount of digital asset is either less than the second amount of digital asset. In embodiments the second transaction further comprises: (C) a fifth transfer of the second amount of digital asset from the first scripted address to the second scripted address. In embodiments the initial channel state further comprises a first timestamp indicating when the first amount of digital asset was transferred to the first scripted address, the first transaction request further comprises a second timestamp indicating when the first order was received, and the second transaction request further comprises a third timestamp indicating when the second order was received.

In embodiments the first mathematical puzzle and the corresponding first mathematical solution are a first set of mathematical puzzles comprising a plurality of mathematical puzzles and corresponding first set of mathematical solutions comprising a plurality of mathematical solutions.

In embodiments the first mathematical solution is a second mathematical puzzle associated with a second mathematical solution.

In embodiments generating the first mathematical puzzle and the corresponding first mathematical solution associated with the first mathematical puzzle comprises: (i) providing, by the exchange computer system, an algorithm to generate the first mathematical puzzle and the corresponding first mathematical solution; (ii) obtaining, by the exchange computer system, an exchange puzzle seed, wherein the exchange puzzle seed is based in part on at least one of: (A) the first user public address; (B) the first exchange public key; (C) the second exchange public key; and (D) the third exchange public key; (iii) generating, by the exchange computer system, a first exchange puzzle value based at least in part on the exchange puzzle seed; (iv) generating, by the exchange computer system, a second exchange puzzle value, such that the application of the algorithm to the first exchange puzzle value results in the second exchange puzzle value; and (v) generating, by the exchange computer system, a third exchange puzzle value, such that the application of the algorithm to the second exchange puzzle value results in the third exchange puzzle value, wherein the second exchange puzzle value is the first mathematical puzzle, and wherein the third exchange puzzle value is the first mathematical solution.

In embodiments the settlement transaction is received by the exchange computer system by receiving the settlement transaction digitally signed by the customer private key from the first user device via the application programming interface.

In embodiments, receiving the settlement transaction digitally signed by the customer private key further comprises: (i) generating, by the exchange computer system, an unsigned settlement transaction; (ii) sending, by the digital asset exchange computer system to the first user device via the application programming interface, the unsigned settlement transaction; and (iii) receiving, by the digital asset exchange computer system from the first user device via the application programming interface, the settlement transaction digitally signed by the customer private key.

In embodiments the first user device is a mobile electronic device operating a mobile application.

In embodiments the method further comprises the steps of: (t) prior to receiving the settlement transaction, transmitting, from the exchange computer system to a third-party computer system, monitoring information comprising: (i) the first scripted address; (ii) the second scripted address; (iii) the exchange public address; and (iv) the first user public address wherein the third-party computer system monitors the first scripted address and the second scripted address to detect a published transaction that is associated with either the first scripted address or the second scripted address, wherein the third-party computer system monitors both the first scripted address and the second-scripted address for the published transaction during the first-time designation, and wherein, in the event the third-party computer system detects the published transaction, the third-party computer system generates and sends a first notification to the first user device. In embodiments the event the third-party computer system detects the published transaction, the third-party computer system generates and sends a second notification to the exchange computer system. In embodiments the third-party computer system monitors the first scripted address and the second scripted address in substantially real-time during the first-time designation.

In embodiments the non-custodial exchange key information further comprises: (iv) the first scripting limitations.

In embodiments the non-custodial exchange key information further comprises: (iv) the second scripting limitations.

In embodiments the non-custodial exchange key information further comprises: (iv) the first scripting limitations; and (v) the second scripting limitations.

In embodiments the second key pair is the third key pair.

In embodiments the first key pair is the third key pair.

In embodiments the first key pair is the second key pair.

In embodiments the digital asset includes at least one of the following: (i) BITCOIN; (ii) ETHER; (iii) LITECOIN; (iv) BITCOIN cash; (v) ZCASH; and (vi) digital asset tokens. In embodiments the digital asset tokens include Gemini dollar.

In embodiments the non-custodial exchange key information is provided by the exchange computer system by transmitting the non-custodial exchange key information to the first user device via the application programming interface.

In embodiments the non-custodial exchange key information is provided by the exchange computer system by publishing the non-custodial exchange key information on a website associated with the digital asset exchange.

In embodiments step (d) occurs before step (c).

In embodiments the initial channel state is received with the first scripted account information.

In embodiments the second scripted account information is received with the first order and the first transaction request.

In embodiments the first scripted address receives the first amount of digital asset from the first user public address.

In embodiments the first transaction further comprises: (iii) a fifth transfer of a sixth amount of digital asset from the first scripted address to the third exchange public address, wherein the sixth amount of digital asset is a trading fee, and wherein the settlement transaction further comprises: (iii) a sixth transfer of a third settlement amount of digital asset from the first scripted address to the third exchange public address, wherein the third settlement amount is the sixth amount, wherein the fourth amount is less than the second amount, and wherein the fifth amount is less than the second amount of digital asset subtracted from the first amount of digital asset.

In embodiments the first scripted address is provided by the first user device. In embodiments the first scripted address is a result of the first user device applying an algorithm to at least one of: (i) the customer public key; (ii) the first exchange public key; (iii) the second exchange public key; (iv) the third exchange public key; and (v) the first mathematical puzzle.

In embodiments the first scripted address is provided by the exchange computer system.

In embodiments the first scripted address is a result of the exchange computer system applying an algorithm to at least one of: (i) the customer public key; (ii) the first exchange public key; (iii) the second exchange public key; (iv) the third exchange public key; and (v) the first mathematical puzzle.

In embodiments the second scripted address is provided by the first user device. In embodiments the second scripted address is a result of the first user device applying an algorithm to at least one of: (i) the customer public key; (ii) the first exchange public key; (iii) the second exchange public key; (iv) the third exchange public key; and (v) the first mathematical puzzle.

In embodiments, the first scripted account is a first pay-to-script-hash account. In embodiments, the second scripted account is a second pay-to-script hash account.

Referring to the process illustrated in connection with FIGS. 72A-72G, in embodiments, the process of trading on a digital asset exchange 6110 using bi-directional channels and a smart contract via an application programing interface (API) 6107 may begin at step S77202. At step S77202, non-custodial trading information may be obtained by a first customer device, e.g., the first user device 6104, associated with a first customer. Referring to FIG. 71A, the non-custodial trading information 7106 may be stored on memory 6102-C of the digital asset exchange computer system 6102. Referring to FIG. 71C, the non-custodial trading information 7106 may include one or more of the following, the exchange public key 7120, the first exchange public address 7109, the second exchange public address 7110, and/or non-custodial formatting requirements 7122. In embodiments, the non-custodial formatting requirements 7122 may include formatting requirements for trading on the digital asset exchange 6110 using a smart contract (e.g., first smart contract 7102). For example, the non-custodial formatting requirements 7122 may include one or more of the following: deposit information requirement module 7124, settlement time requirement module 7126, first waiting period requirement module 7128, second waiting period requirement module 7130, a white list associated with the digital asset exchange 6110, and/or a black list associated with the digital asset exchange 6110.

The modules within the non-custodial formatting requirements 7122 may allow for one or more customers to customize their non-custodial trading session. The customization of the non-custodial trading session, in embodiments, may be shaped by the modules of the non-custodial formatting requirements 7122. For example, the deposit information requirement module 7124 may require one or more of the following: a disclosure of the amount the customer intends to deposit for trading, a minimum deposit amount and/or a maximum deposit amount (which, in embodiments, may be related to the customer and/or information thereof). As another example, the settlement time requirement module 7126 may allow the customer to choose a time and/or date at which the non-custodial trading session (e.g., the time between deposit and settlement) begins and/or ends. In embodiments, as another example, the first waiting period requirement module 7128 may allow the customer to decide how much time should transpire between initiating settlement and finalizing settlement. In embodiments, the first waiting period requirement module 7128 may put limits on the amount of time—e.g., not zero, more than 10 minutes, less than two weeks, and/or less than one year, to name a few. In embodiments, as another example, the second waiting period requirement module 7130 may allow the customer to decide how much time of inaction on the part of the digital asset exchange computer system 6102 before the customer can get a refund of their deposit. In embodiments, the second waiting period requirement module 7130 may put limits on the amount of time—e.g., not zero, more than 10 minutes, less than two weeks, and/or less than one year, to name a few.

In embodiments, the digital asset exchange computer system 6102 may limit the customers who can use non-custodial trading via a white list associated with the digital asset exchange 6110 and/or a black list associated with the digital asset exchange 6110.

In embodiments, the non-custodial trading information 7106 may be obtained by the first user device 6104 by receiving the non-custodial trading information 7106 from the digital asset exchange computer system, via a network connection and/or an API. In embodiments, the non-custodial trading information 7106 may be obtained by the first user device 6104 by accessing the information on a website associated with the digital asset exchange computer system 6102.

The exchange public key 7120, in embodiments, may be a public key associated the digital asset exchange 6110 and blockchain 6108. Referring to FIG. 71A, the digital asset exchange computer system 6102 may be associated with one or more public addresses on the blockchain 6108. The first exchange public address 7109, in embodiments, may be a public address used by the digital asset exchange computer system 6102 to receive sums of digital assets being traded on the digital asset exchange 6110. In embodiments, the second exchange public address 7110 may be a public address used by the digital asset exchange computer system 6102 to receive fees relating to trading on the digital asset exchange 6110. In embodiments, the digital asset exchange computer system 6102 may use one public address for fees and traded digital assets.

In embodiments, the non-custodial trading information 7106, in embodiments, may also include the first smart contract instructions 7108 and/or the first smart contract address 7104.

Referring back to FIG. 72A, to begin a non-custodial trading session, the first user device 6104 may, at step S77204, generate a non-custodial trading request. In embodiments, the non-custodial trading request may include one or more of the following: a first customer public address (e.g., first user public address 7105), the exchange public key 7120, a first smart contract address (e.g., first smart contract address 7104) associated with the blockchain and the digital asset, and first smart contract instructions (e.g., first smart contract instructions 7108). In embodiments, the first smart contract address 7104 is provided by the first user device 6104. In embodiments, the first smart contract address 7104 is provided by the digital asset exchange computer system 6102. In embodiments, the first smart contract address 7104 is generated by applying an algorithm to one or more of: the first customer public key, the exchange public key 7120, the first exchange public address 7109, the second exchange public address 7110, and/or the first user public address 7105, to name a few.

In embodiments, the non-custodial trading request may be generated with the help of a graphical user interface displayed on the first user device 6104. Referring to FIG. 71D, the user may log into an application associated with the digital asset exchange 6110 and be presented with a GUI prompting the customer to input one or more data fields. For example, the graphical user interface may prompt the user to input one or more of the following: first customer public address 7134, first exchange public key 7136, second exchange public key 7138, settlement time 7140, first waiting period 7142, second waiting period 7144, and/or intended deposit amount 7146. Once inputted, the customer may select "SUBMIT" which may cause a non-custodial trading request to be sent to the digital asset exchange computer system 6102. In embodiments, the "SUBMIT" selection may also cause the first smart contract address 7104 to be generated and published.

Figure 71B:
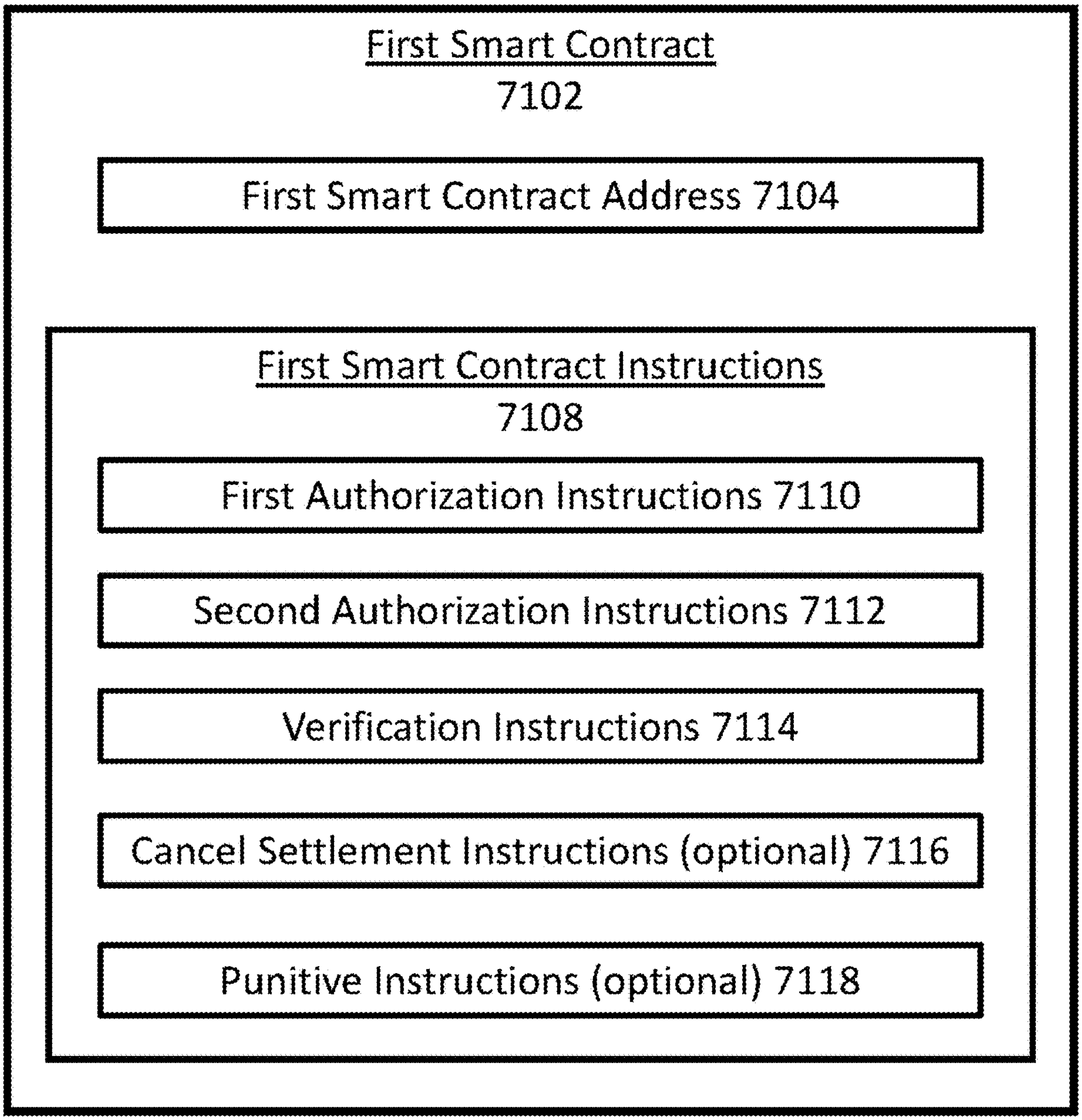
FIG. 71B is an exemplary block diagram illustrating a first smart contract in accordance with exemplary embodiments of the present invention.
Figure 71C:
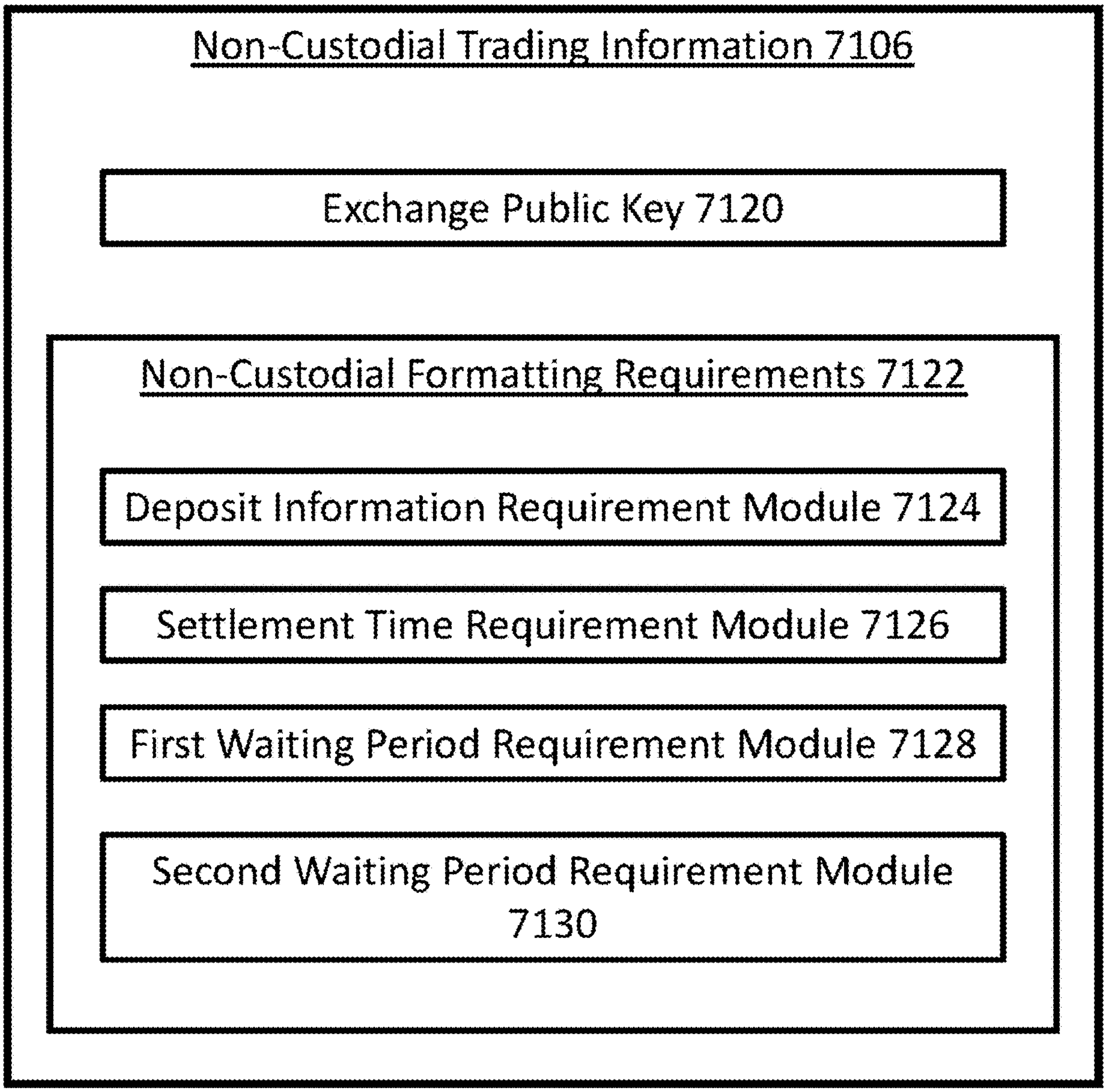
Figure 71D:
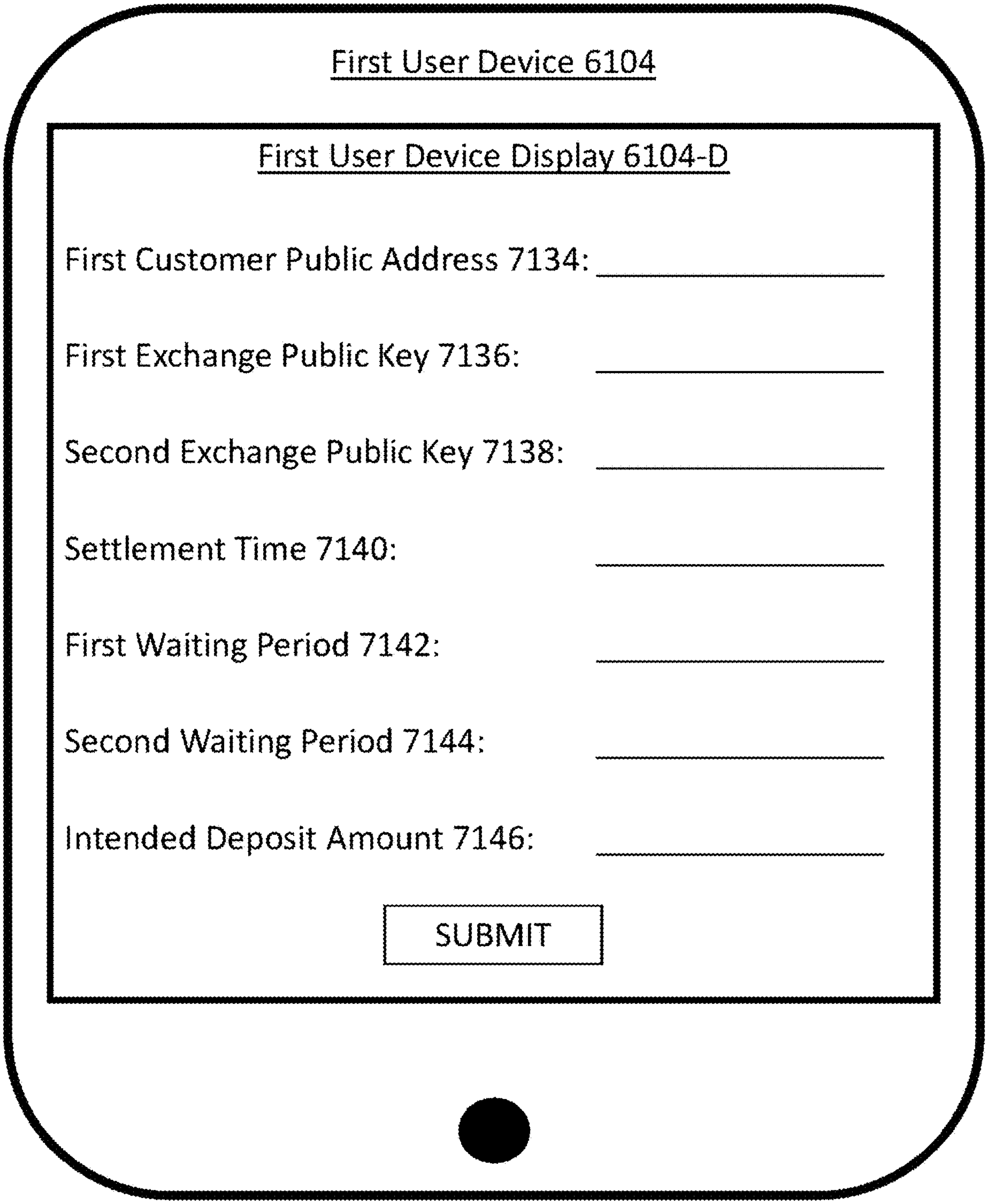

Referring to FIG. 71B, the first smart contract 7102 may be associated with the first smart contract address 7104 and first smart contract instructions 7108. The first smart contract instructions 7108, provided by the customer, may include one or more of the following: first authorization instructions 7110, second authorization instructions 7112, verification instructions 7114, cancel settlement instructions 7116, and/or punitive instructions 7118. In embodiments, the first authorization instructions may authorize transactions that are: (1) digitally signed by the customer private key; (2) received from the first user public address 7105; and (3) received after a first waiting period has transpired since an initiate settlement message was received by the first user public address 7105, first exchange public address 7109, and/or the second exchange public address 7110. In embodiments, the first waiting period may correspond to the amount of time to transpire between the initiate settlement message and a finalize settlement message (e.g., the information supplied regarding the first waiting period requirement module 7128). In embodiments, the first authorization instructions may authorize transactions that are: (1) digitally signed by the customer private key; (2) received from the first user public address 7105; and (3) received after the first smart contract address 7104 received an initiate settlement message from the first user public address 7105, first exchange public address 7109, and/or the second exchange public address 7110.

In embodiments, the second authorization instructions 7112 may authorize transactions that are: (1) digitally signed by the customer private key; (2) received from the first user public address 7105; and (3) received after a second waiting period has transpired since at least one order and/or transaction was transmitted to the digital asset exchange computer system 6102 and not executed by the digital asset exchange computer system 6102. In embodiments, the second waiting period may correspond to the amount of time to transpire that allows a customer to get a refund due to inactivity on the part of the digital asset exchange computer system 6102.

In embodiments, the verification instructions 7114 may correspond to instructions that verify initiate settlement messages when a dispute message is received by the first smart contract address 7104 during the first waiting period. For example, if a party to the contract disputes the initiate settlement message that is published by the first smart contract 7102, the party disputing the message may generate and transmit a dispute message to the first smart contract address 7104 during the first waiting period.

In embodiments, the cancel settlement instructions 7116 may control situations where a dispute message is received, and the initiate settlement message is deemed to be not verified. The cancel settlement instructions 7116, when a settlement message is not able to be verified, may cause the first smart contract 7104 to do one or more of the following: (1) cancel the settlement; (2) settle the contract based on the dispute message; and/or (3) communicate with the punitive instructions to determine the punitive penalty, to name a few.

In embodiments, the punitive instructions 7118 may impose a penalty on the party that transmitted the initiate settlement message that is not able to be verified. The penalty, in embodiments, may be a penalty fee, which, in embodiments, may be a percentage of the deposit, a static fee, a fee on a sliding scale based on the initiate settlement message, and/or the entirety of the amount of assets in the custody of the first smart contract 7102, to name a few.

In embodiments, the non-custodial trading request may also include a request to set up an API connection between the first user device 6104 and the digital asset exchange computer system 6102. In embodiments, to connect with the digital asset exchange computer system a user device associated with the customer (e.g., first customer 6202) may send a request from the first user device 6104 to the digital asset exchange computer system 6102 via network 125. In embodiments, in response to receiving the request, the digital asset exchange computer system 6102 may process and accept the request and set up the connection. In embodiments, a completed connection may be signaled and/or confirmed by the digital asset exchange computer system 6102 by generating and transmitting a confirmation message to the first user device 6104.

In embodiments, the generation of the first smart contract 7102, the first smart contract address 7104, the first smart contract instructions 7108 and/or the providing of the non-custodial trading information may be similar to the generation and providing of the non-custodial exchange key information 6104 and the scripted account information 6106 described above in connection with FIGS. 61A, 61B, 61C, and 63A-63D, the descriptions of which applying herein.

Figure 72A:
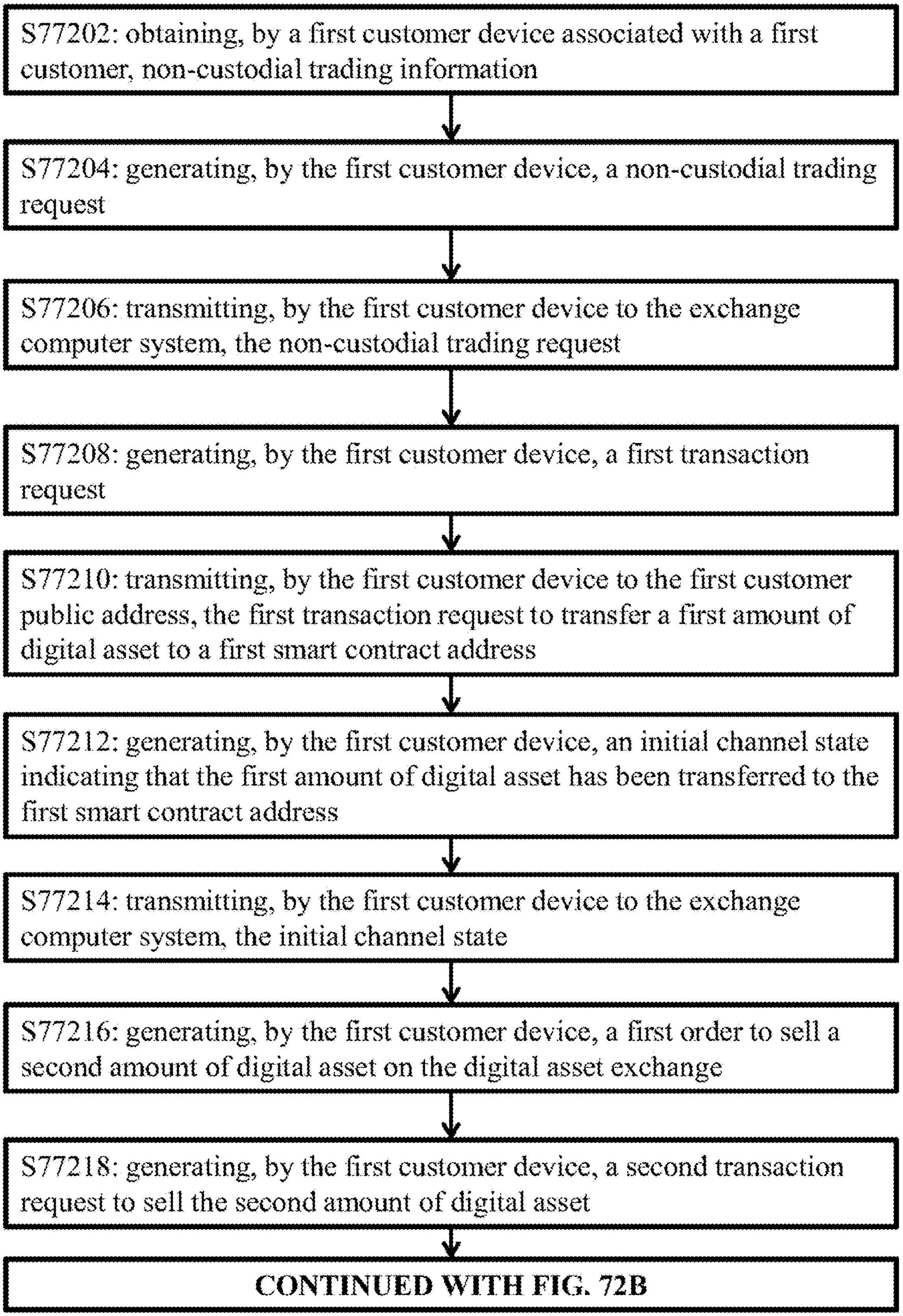

Referring to FIG. 72A, the process may continue with step S77206. At step S77206, the first user device 6104 transmits the non-custodial trading request to the digital asset exchange computer system via network 125 and/or an API connection between the first user device 6104 and the digital asset exchange computer system 6102. In embodiments, after receiving the non-custodial trading request, the digital asset exchange computer system 6102 may verify the non-custodial trading request (see, e.g., FIG. 73A, step S77306, the description of which applying herein). In embodiments, if the non-custodial trading request is verified, the digital asset exchange computer system 6102 may generate and send a confirmation message to one or more of the first user device 6104 and/or the first user public address 7105. In embodiments, if the non-custodial trading request is not verified, the digital asset exchange computer system 6102 may generate and send a failed verification message to one or more of the first user device 6104 and/or the first user public address 7105 and the process may stop.

In embodiments, the process of FIGS. 72A-72H may continue with step S77208. At step S77208, the first user device 6104 may generate a first transaction request. In embodiments, the first transaction request may include a transfer of a first amount of digital asset from the first user public address 7105 to the first smart contract address 7104. The first transaction request, in embodiments, may be digitally signed by the first customer private key.

In embodiments, the process of FIGS. 72A-72H may continue with step S77210. At step S77210, the first user device 6104 may transmit the first transaction request. The first transaction request, in embodiments, may be transmitted to the first user public address 7105 via the blockchain. In embodiments, the first transaction request may be transferred to an administrator public address associated with the blockchain via the blockchain from the first user public address 7105. In embodiments, the first transaction request may be transferred to the first exchange public address 7109 or the second exchange public address 7110 via the blockchain from the first user public address 7105.

In embodiments, the first user device 6104 may generate one or more puzzles with one or more corresponding solutions. The generation of puzzles and corresponding solutions may be similar to the description above in connection with FIGS. 63A-63D, the description of which applying herein.

In embodiments, the process of FIGS. 72A-72H may continue with step S77212. At step S77212, the first user device 6104 may generate an initial channel state. The initial channel state may indicate that the first amount of digital asset was deposited into the first smart contract address 7105. In embodiments, the initial channel state may include a time stamp indicating the time at which the first amount of digital asset was deposited. In embodiments, the initial channel state may be similar to the first channel state 6406 described above in connection with FIG. 64 and the initial channel state described above in connection with FIGS. 63A-63D, the descriptions of which applying herein.

In embodiments, the process of FIGS. 72A-72H may continue with step S77214. At step S77214, the first user device 6104 may transmit the initial channel state to the digital asset exchange computer system via network 125. After receiving the initial channel state, the digital asset exchange computer system may verify the initial channel state by checking to see if the first smart contract 7104 is published and to see whether the first amount of digital asset was deposited into the first smart contract 7104. In embodiments, if the initial channel state is verified, the digital asset exchange computer system 6102 may generate and send a confirmation message to one or more of the first user device 6104 and/or the first user public address 7105. In embodiments, if the initial channel state is not verified, the digital asset exchange computer system 6102 may generate and send a failed verification message to one or more of the first user device 6104 and/or the first user public address 7105 and the process may stop.

In embodiments, the process of FIGS. 72A-72H may continue with step S77216. At step S77216, the first customer device may generate a first order. In embodiments, the first order may be to transfer a second amount of digital assets. For example, the first order may be to sell 5 BITCOIN. In embodiments, the second amount of digital asset may be less than or equal to the first amount of digital asset, which may be verified by the digital asset exchange computer system 6102 (see e.g., FIG. 73, step S77316, the description of which applying herein). The first order, in embodiments, may be digitally signed by the first customer private key. In embodiments, the first order may include a timestamp indicating the time at which the first order was transmitted to and/or received by the digital asset exchange computer system 6102.

In embodiments, the process of FIGS. 72A-72H may continue with step S77218. At step S77218, the first customer device may generate a second transaction request. The second transaction request may be digitally signed by the first customer private key and include one or more of the following: (1) a first transfer of the second amount of digital asset from the first smart contract address 7104 to the first exchange public address 7109; (2) a second transfer of a third amount of digital asset from the first smart contract address 7104 to the second exchange public address 7110 (the third amount, for example, corresponding to a trading fee); (3) a third transfer of a fourth amount of digital asset from the first smart contract address 7104 to the first user public address 7105 (the fourth amount of digital asset may correspond to the first amount of digital asset less the sum of the second and third amount of digital asset); and/or (4) a first customer mathematical puzzle. In embodiments, the second transaction request may include a timestamp indicating the time at which the second transaction request was transmitted to and/or received by the digital asset exchange computer system 6102.

Figure 72B:
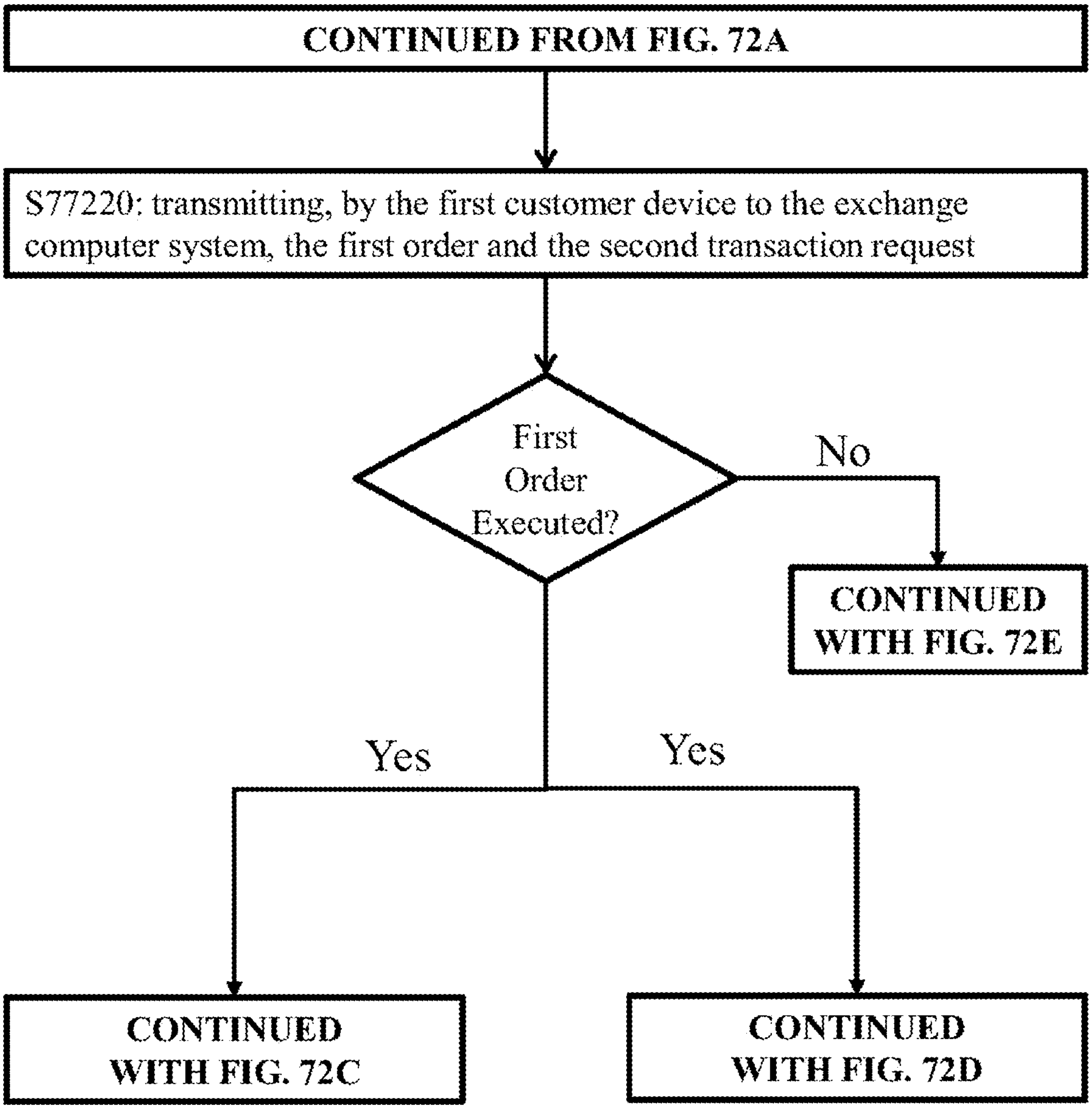

In embodiments, the process of FIGS. 72A-72H may continue with FIG. 72B. Referring to FIG. 72B, at step S77220, the first user device 6104 may transmit the first order and the second transaction request to the digital asset exchange computer system 6102 via network 125 and/or API connection 6107. In embodiments, the second transaction request may be transmitted to the first smart contract address 7104 from the first user public address 7105 via the blockchain 6108. In embodiments, upon receipt of the second transaction request, the first smart contract 7102 may store the second transaction request until the settlement time has arrived. In embodiments, the first order may be transmitted separately, together with, or contemporaneously with the second transaction request. In embodiments the second transaction request may be transmitted before the first order. In embodiments, the first order may be transmitted before the second transaction request.

In embodiments, upon receipt of the first order, the digital asset exchange computer system 6102 may execute the first order (may be similar to the description of the execution of the first order in step S6328 of FIG. 63D, the description of which applying herein). Upon execution of the first order, in embodiments, the digital asset exchange computer system may generate and transmit a confirmation message, noting that the first order was executed. In embodiments, upon execution of the first order, the digital asset exchange computer system 6102 may note the execution of the first order in a ledger operatively connected to the digital asset exchange computer system 6102. The ledger, in embodiments, may be available to the public or to customers of the digital asset exchange 6110.

In embodiments, the first order may not be executed by the digital asset exchange computer system 6102. Referring to FIG. 72E, in the event that the first order was not executed, and the second waiting period has expired, the process of FIGS. 72A-72H may continue with step S77254. At step S77254, the first customer device determines that the first order was not executed. As mentioned above, this determination may be made by not receiving a confirmation message and/or seeing the first order is not on the ledger. This determination may also be made by a trusted third party computer system (e.g., a watch tower). In embodiments, as mentioned above, the second waiting period may correspond to a time of inactivity that may trigger a refund of the first customer's digital assets from the first smart contract 7102.

Figure 74:
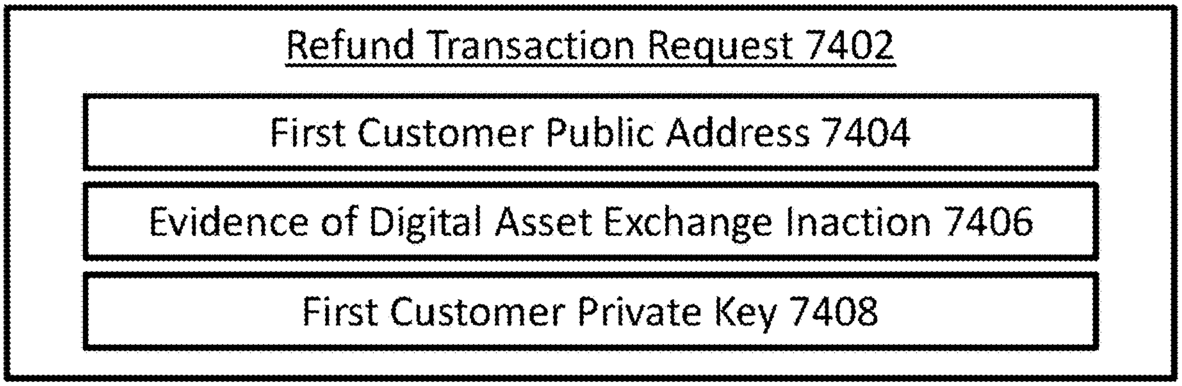

After determining that the first order was not executed, and the second waiting period has expired, the process may continue with step S77256. At step S77256, the first user device 6104 may generate a digitally signed refund transaction request. Referring to FIG. 74, a refund transaction request 7402 may include one or more of the following. (1) the first customer public address 7404 (e.g., the first user public address 7105); (2) evidence of the digital asset exchange inaction 7406; (3) the first customer private key 7408; (4) a public address the first customer wishes the refund to be transferred to; and/or (5) a timestamp, to name a few. The evidence of the digital asset exchange's inaction 7406 (and/or the digital asset exchange computer system's inaction) may include one or more of the following: (1) the first order; (2) the second transaction request; (3) a timestamp associated with the first order; (4) a timestamp associated with the second transaction request; (5) a third transaction request digitally signed by the customer private key requesting a transfer of the first amount of digital asset from the first smart contract address 7104 to the first user public address 7105; and/or (6) a copy of the entire and/or relevant portions of the ledger during the second waiting period, to name a few.

Referring to FIG. 72E, the process for a refund may continue with step S77258. At step S77258, the first customer device may transmit the digitally signed refund transaction request 7402 from the first user public address 7105 to the first smart contract address 7104 via the blockchain 6108. Once received, the first smart contract 7102 may verify whether the digital asset exchange computer system 6102 has been inactive with regards to the first order for the second waiting period.

In embodiments, if the refund transaction request 7402 is not verified, the first smart contract 7102 may generate and transmit a failure message indicating as such to the first user device 6104 and/or the first user public address 7105. In embodiments, if the refund transaction request is not verified, the first smart contract 7102 may impose a penalty fee on the first customer.

In embodiments, the refund transaction request 7402 may be verified. If the refund transaction request 7402 is verified, the process may continue with step S77260. At step S77260, the first smart contract transfers the first amount of digital asset from the first smart contract address 7104 to the first user public address 7105. In embodiments, the first smart contract instructions 7108 may include a penalty fee for inactivity on the part of the digital asset exchange computer system 6102. If a penalty fee may be imposed, in embodiments, the digital asset exchange computer system 6102 may, prior to verifying the initial channel state, deposit collateral into the first smart contract 7102 to cover any potential fees. The collateral may be used at step S77260'. At step S77260' the first smart contract may transfer the first amount of digital asset and a first penalty fee in digital asset to the first user public address 7105.

In embodiments, the first order may be executed by the digital asset exchange computer system 6102. In embodiments, the first user device 6104 may continue to generate and transmit orders and transaction requests before the settlement time has arrived (repeating steps S77216-S77220). Each time a new order is transmitted to the digital asset exchange computer system 6102, in embodiments, the second waiting period may reset. In embodiments, if a second order is sent before the first order has been executed, the second waiting period may continue to toll until the first order has been executed.

Figure 72C:
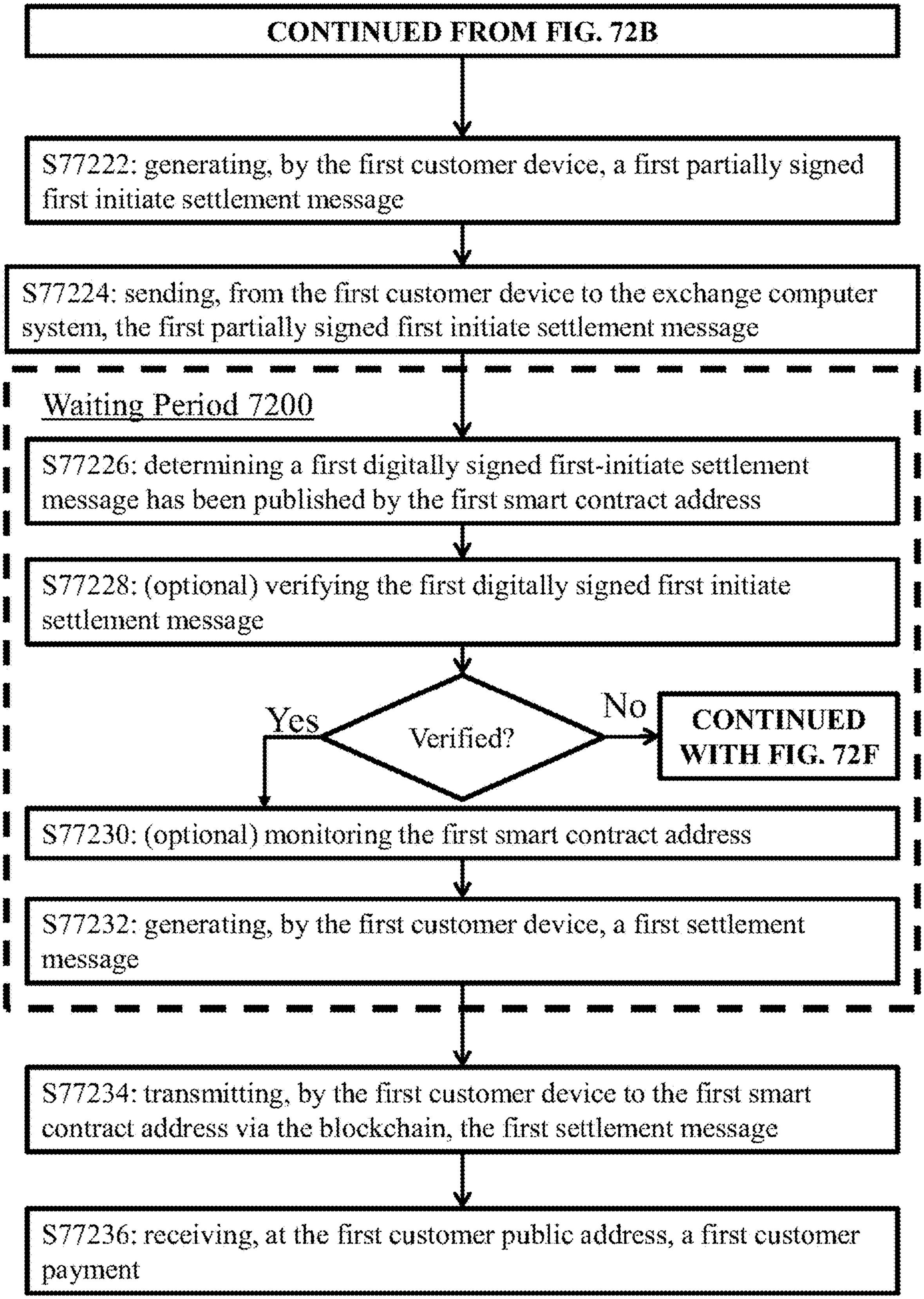
Figure 72D:
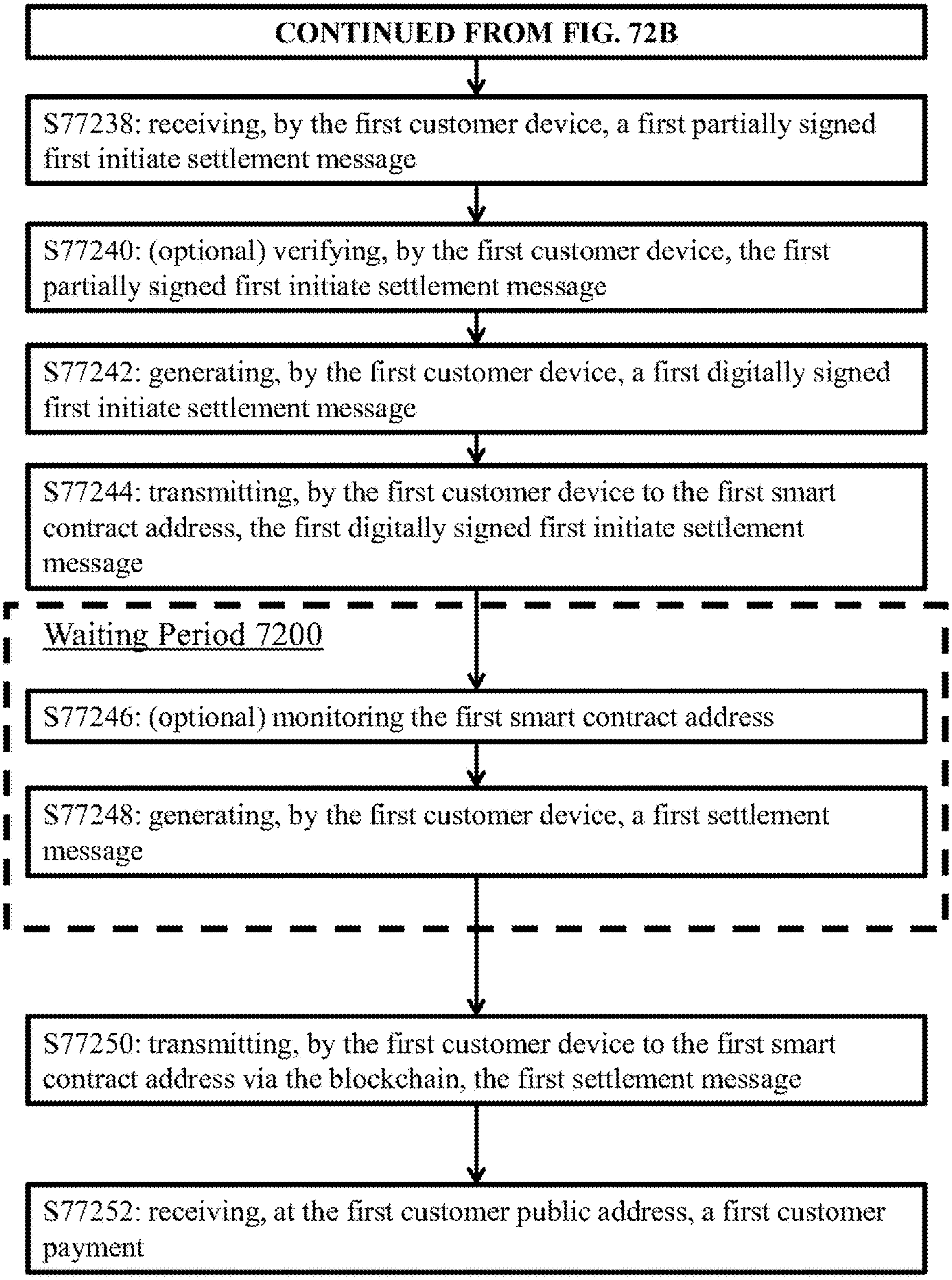
Figure 72E:
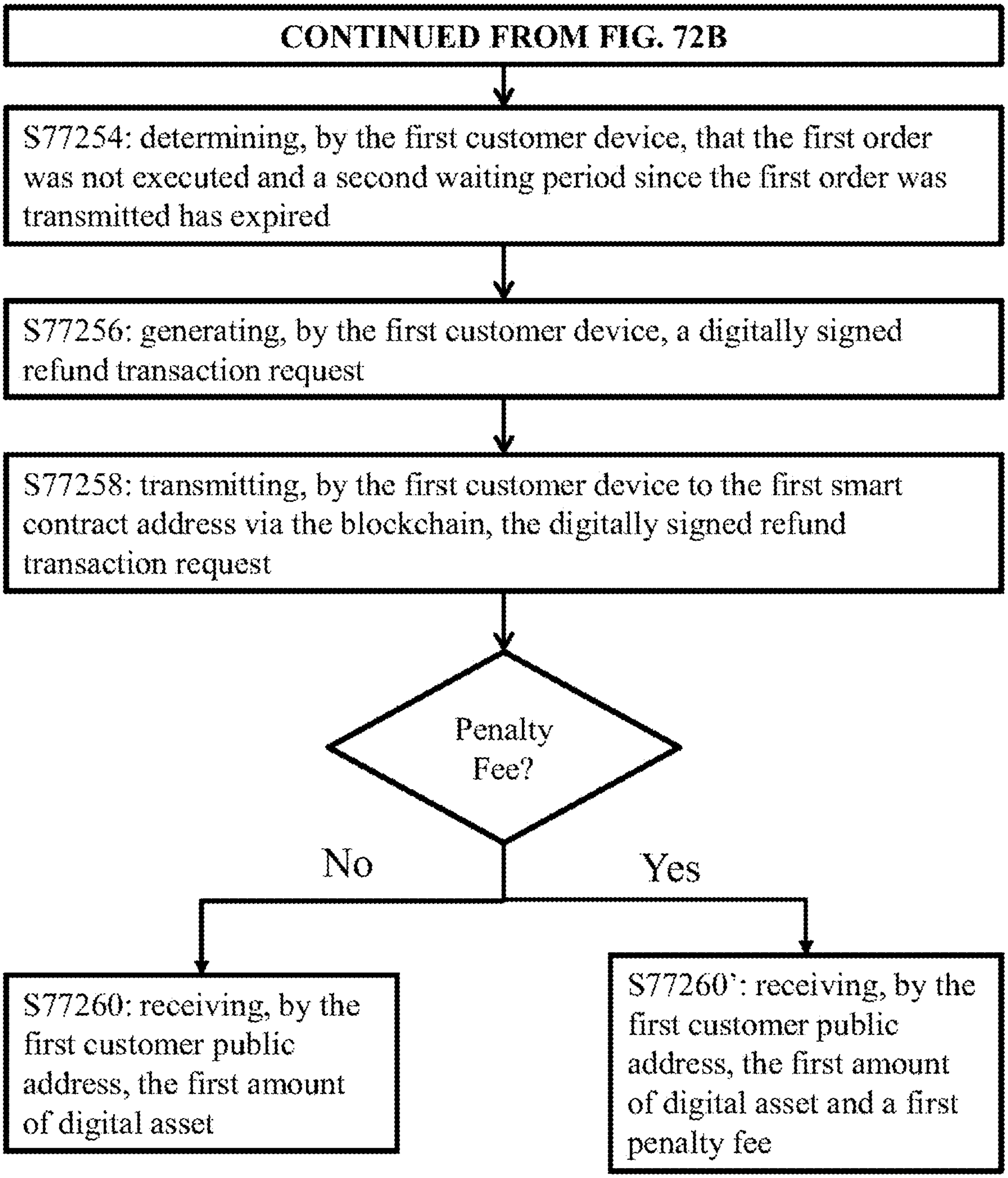

Referring to FIG. 72B, if the first order was executed, the process of FIGS. 72A-72H may continue with either FIG. 72C. Referring to FIG. 72C, at step S77222 the first customer device may generate a first partially signed first initiate settlement message. To initiate settlement when the non-custodial trading session has expired, an initiate settlement message digitally signed by the first customer private key and the digital asset exchange private key may be sent to the first smart contract address 7104. A partially signed initiate settlement message, in embodiments, may include one or more of the following: (1) a customer payment amount indicating a final amount of digital asset owned by the customer and/or in the custody of the first smart contract 7102; (2) an exchange payment amount indicating a final amount of digital asset owned by the digital asset exchange 6110 and/or in the custody of the first smart contract 7102; (3) a customer digital signature or an exchange digital signature (e.g., partially signed); and/or (4) a most recent mathematical puzzle associated with the digital asset exchange computer system 6102 and/or the first user device 6104, to name a few. The most recent mathematical puzzle, in embodiments, may be used alternatively or in combination with a timestamp.

Once generated, at step S77224, the first user device 6104 may transmit the partially signed first initiate settlement message to the digital asset exchange computer system via network 125 and/or API 6107. After the digital asset exchange computer system 6102 receives the first partially signed initiate settlement message, the digital asset exchange computer system 6102 may verify the first partially signed first initiate settlement message (see e.g., step S77326 of FIG. 73C, the description of which applying herein). In embodiments, the digital asset exchange computer system 6102 may not verify the first partially signed initiate settlement message. If the first partially signed initiate settlement message is not verified, in embodiments, the process may continue with FIG. 72D. In embodiments, if the first partially signed initiate settlement message is verified by the digital asset exchange computer system 6102, the digital asset exchange computer system may digitally sign the first partially signed initiate settlement message, generating a digitally signed first initiate settlement message. In embodiments, the digitally signed first initiate settlement message may be transmitted by the digital asset exchange computer system to the first smart contract address 7104 via the blockchain 6108

Continuing the process of FIG. 72C, at step S77226, it is determined that the first digitally signed initiate settlement message has been received by the first smart contract address 7104. This determination, in embodiments, may be made by one or more of the following: the first user device 6104, a confirmation message received by the first user device 6104 from the digital asset exchange computer system 6102; and/or a trusted third party notifying the first user device 6104, to name a few. The receipt of the digitally signed initiate settlement message may, in embodiments, trigger the waiting period 7200 (e.g., the first waiting period).

In embodiments, during waiting period 7200 at step S77228, the first digitally signed first initiate settlement message may be verified by the first user device 6104. In embodiments, the first user device 6104 may verify that the payment amounts—e.g., the second amount and the third amount going to the digital asset exchange 6110 and the fourth amount going to the first user public address 7105—are correct. In embodiments, the payment amounts may be incorrect—e.g., the amount being transferred to the first user is incorrect and/or the amount being transferred to the digital asset exchange 6110 is incorrect, the process may continue with FIG. 72F. The verification may be completed by a trusted third party and/or the first user device 6104, to name a few.

Figure 72F:
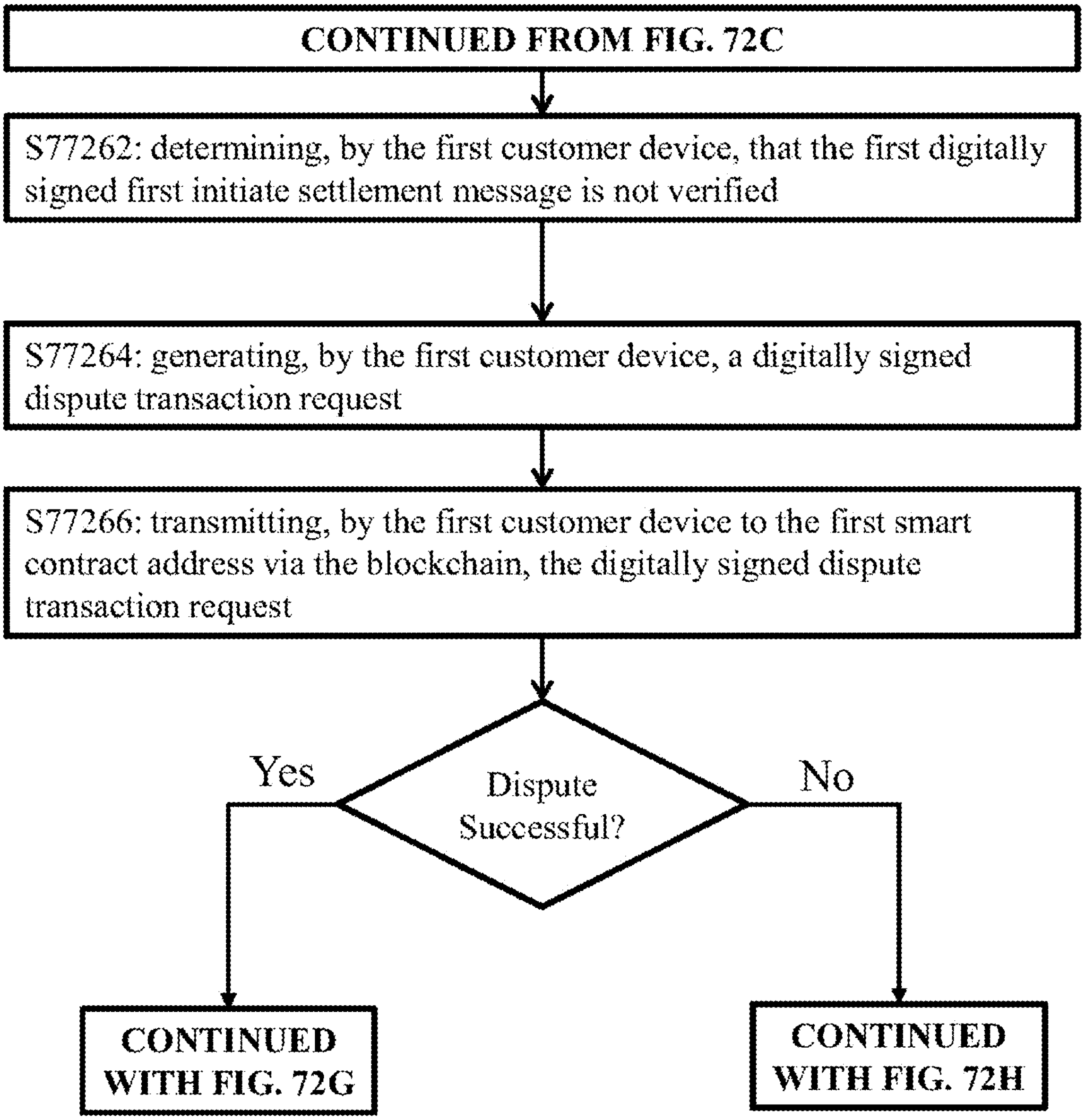

Referring to FIG. 72F, at step S77262, the first user device 6104 may determine that the first digitally signed first initiate settlement message is not verified.

Figure 75A:
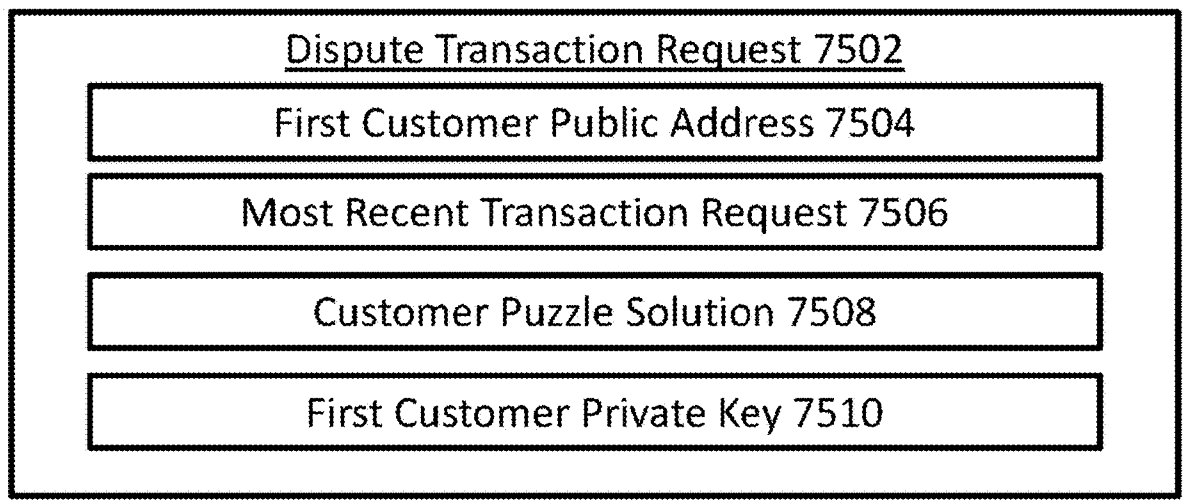
Figure 75B:
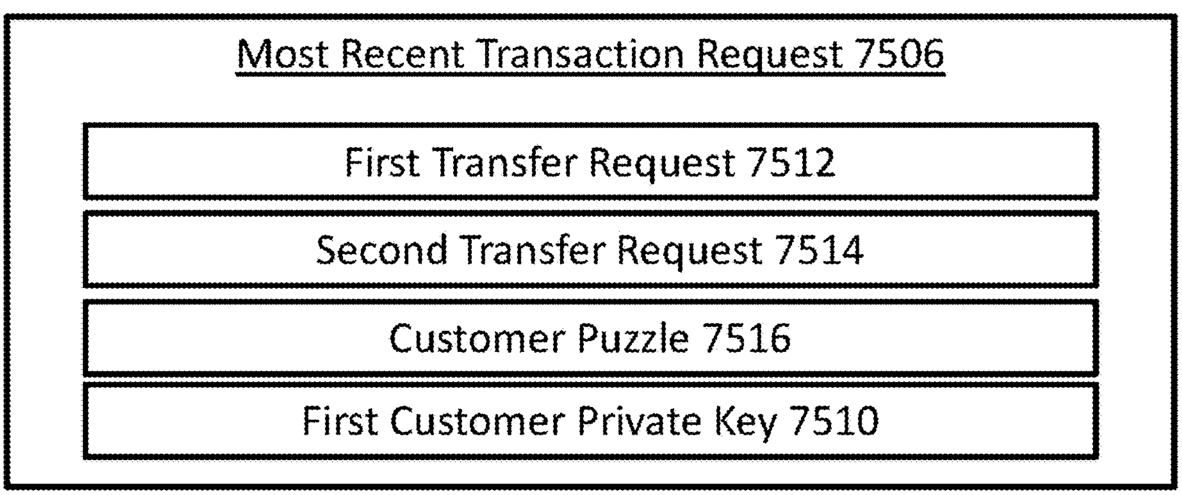

Once the digitally signed first initiate settlement message is not verified, if the smart contract is still within waiting period 7200, at step S77264, the first user device 6104 may generate a digitally signed dispute transaction request. Referring to FIG. 75A, a dispute transaction request 7502 may include one or more of the following: the first customer public address 7504 (e.g., the first user public address 7105); the most recent transaction request 7506 (e.g., the second transaction request); the customer puzzle solution 7508; the first customer private key 7510; and/or a brief description of what is incorrect about the first digitally signed first initiate settlement message, to name a few. The customer puzzle solution 7508, in embodiments, may be the corresponding solution to the puzzle included with the most recent transaction request 7506. In embodiments, referring to FIG. 75B, the most recent transaction request may include: the first transfer request 7512 (e.g., transferring the second amount of digital assets to the first exchange public address 7109); the second transfer request 7514 (e.g., transferring of the fourth amount of digital assets to the first user public address 7105); the third transfer request (e.g., transferring the third amount of digital asset to the second exchange public address 7110); the customer puzzle 7516 (e.g., the customer puzzle corresponding to the customer puzzle solution 7508); and/or the first customer private key 7510, to name a few. In embodiments, the most recent transaction request is a copy of the second transaction request.

The process for disputing an initiate settlement message may continue with step S77266. At step S77266 the first user device 6104 transmits the digitally signed dispute transaction request to the first smart contract address 7104 from the first user public address 7105 via the blockchain 6108. Upon receipt, the first smart contract 7102 may verify the dispute transaction request in accordance with the verification instructions 7114. In embodiments, the dispute transaction request may be verified by checking the customer puzzle solution 7508 to determine whether it corresponds to the customer puzzle 7516 of the most recent transaction. If the customer puzzle solution 7508 proves the most recent transaction request 7506 is the correct transaction request to be used for settlement, the dispute may be successful. If the customer puzzle solution 7508 does not prove the most recent transaction request 7506 is the correct transaction request to be used for settlement, the dispute may not be successful.

Figure 72G:
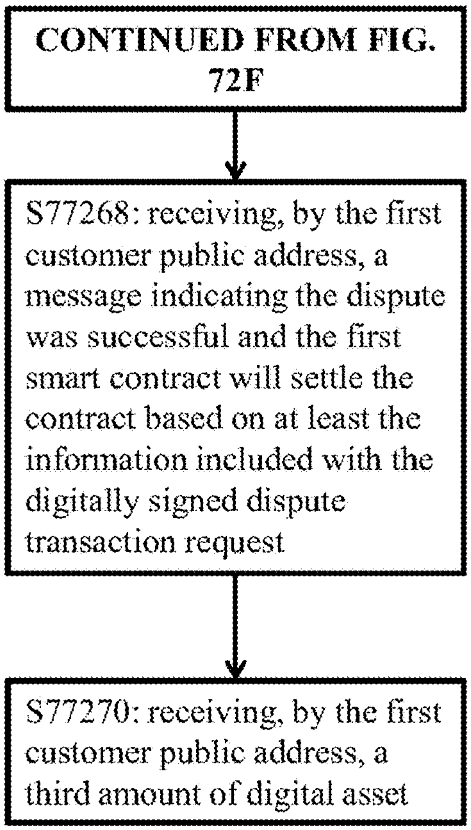

In embodiments, the dispute may be successful. Referring to FIG. 72G, if the dispute is successful, the process may continue at step S77268. At step S77268 the first customer public address 7105 and/or the first user device 6104 may receive a message from the first smart contract address 7104. The message, in embodiments, may indicate the dispute was successful. The message, in embodiments, may also indicate the next steps for the first smart contract 7102. In embodiments, a successful dispute may cause the first smart contract 7102 to settle using the most recent transaction request 7506 (e.g., the first smart contract 7102 executes the most recent transaction request 7506). In embodiments, a successful dispute may incur a penalty fee on the party submitting the digitally signed first initiate settlement message. For example, the penalty fee may be taken out of the second and/or third amount of digital asset and added to the fourth amount of digital asset. Based upon the new amounts associated with the digital assets in the custody of the first smart contract 7102, the first smart contract 7102, in embodiments, may execute the transaction request.

In embodiments, the dispute may be successful, but the amounts of digital asset to be distributed may still be incorrect. In those embodiments, the first smart contract 7102 may generate and send a notification, requesting a second initiate settlement message with correct amounts. The notification, in embodiments may be sent to the first user public address 7105, the first exchange public address 7109, and/or the second exchange public address 7110, to name a few.

In embodiments, the process for a successful dispute may continue with step S77270. At step S77270, in embodiments, the first user public address 7105 may receive an amount of digital asset. The amount of digital asset, in embodiments, may be the fourth amount of digital asset. In embodiments, the amount of digital asset may be the fourth amount of digital asset plus the penalty fee.

Figure 72H:
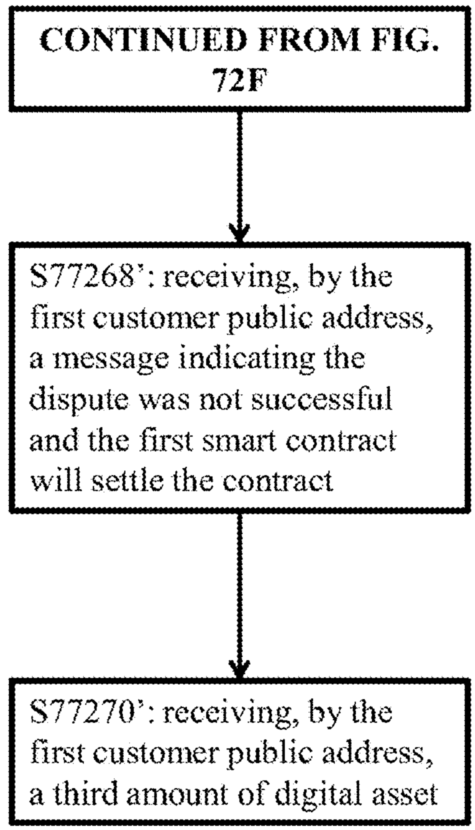

In embodiments, the dispute may be unsuccessful. Referring to FIG. 72H, if the dispute is not successful, the process may continue at step S77268'. At step S77268' the first customer public address 7105 and/or the first user device 6104 may receive a message from the first smart contract address 7104. The message, in embodiments, may indicate the dispute was not successful. The message, in embodiments, may also indicate the next steps for the first smart contract 7102. In embodiments, an unsuccessful dispute may cause the first smart contract 7102 to settle immediately, even if there is time left on waiting period 7200. In embodiments, an unsuccessful dispute may merely cause the first smart contract 7102 to generate and send the message, continuing to wait for the waiting period 7200 to transpire, then wait for a finalize settlement message (e.g., continuing the process of FIG. 72C). In embodiments, an unsuccessful dispute may incur a penalty fee on the party submitting the dispute transaction request. For example, the penalty fee may be taken out of the fourth amount and added to the second and/or third amount of digital asset. Based upon the new amounts associated with the digital assets in the custody of the first smart contract 7102, the first smart contract 7102, in embodiments, may settle the contract.

In embodiments, the process for an unsuccessful dispute may continue with step S77270'. At step S77270', in embodiments, the first user public address 7105 may receive an amount of digital asset. The amount of digital asset, in embodiments, may be the fourth amount of digital asset. In embodiments, the amount of digital asset may be the fourth amount of digital asset minus the penalty fee.

Referring back to FIG. 72C, in embodiments, the digitally signed initiate settlement message may be verified. In embodiments, during the waiting period 7200, at step S77230, the first smart contract address 7104 may be monitored by the first user device 6104, a trusted third party, and/or an entity operating on behalf of the first customer and/or digital asset exchange 6110, to name a few. In embodiments, the monitoring may occur in substantially real-time during the first waiting period. The monitoring, in embodiments, may be to determine if another transaction request and/or message has been sent to the first smart contract address 7104.

In embodiments, the first smart contract address 7104 may be monitored by a third-party computer system. In embodiments, the first user device 6104 and/or the digital asset exchange computer system 6102 may transmit monitoring information to the trusted third-party computer system. The monitoring information, in embodiments, may include one or more of the following: (1) the first smart contract address 7104; (2) the first user public address 6105; (3) the first exchange public address 7109; (4) the second exchange public address 7110; and/or (5) the first waiting period, to name a few. The monitoring information, in embodiments, may enable the trusted third-party computer system to monitor the first smart contract address 7104. If the third-party computer system detects activity at the first smart contract address 7104 (e.g., a message, transaction, to name a few), the third-party computer system may generate and send a notification to one or more of the following: the first user device 6104, the digital asset exchange computer system 6102, the first user public address 7105, the first exchange public address 7109, and/or the second exchange public address 7110, to name a few.

Next, at step S77232, the first customer device may generate a first settlement message (e.g., a finalize settlement message). The first settlement message may direct the first smart contract 7102 to settle based on the initiate settlement message received by the first smart contract address 7104. In embodiments, the first settlement message may be digitally signed by the first customer private key.

After generating the first settlement message, at step S77234, the first user device 6104 may transmit the first settlement message to the first smart contract address 7104 via the blockchain. In embodiments, the first settlement message may be transmitted from the first user public address 7105. The first settlement message, in embodiments, may cause the first smart contract 7102 to settle.

In embodiments, because the digital asset exchange computer system 6102 sent the initiate settlement message, the first customer may not have to wait the first waiting period. The first waiting period, in embodiments, may allow for a customer and/or digital asset exchange 6110 to dispute the initiate settlement message. Thus, the party that did not send the message, in embodiments, may be the party to use the first waiting period to verify and/or dispute the initiate settlement message.

In embodiments, alternative to generating and sending a settlement message, the first user device 6104 may send a message and/or notification to the digital asset exchange computer system 6102, indicating that the customer verified the initiate settlement message and would like to finalize the settlement. In embodiments, in response to the message and/or notification, the digital asset exchange computer system 6102 may generate and send a first settlement message to the first smart contract address 7104 via the blockchain 6108.

Continuing the process, the first smart contract 7102 may settle and transfer the fourth amount of digital asset to the first user public address 7105. At step S77236, the first user public address 7105 may receive the first customer payment (e.g., the fourth amount of digital asset).

In embodiments, referring back to FIG. 72B, if the first order was executed, the process of FIGS. 72A-72H may continue from step S77220 with FIG. 72D. Referring to FIG. 72D, at step S77238, the first user device 6104 may receive a first partially signed first initiate settlement message. In embodiments, the partially signed first initiate settlement message may be received from the digital asset exchange computer system 6102 via network 125 and/or API 6107.

After receiving the partially signed first initiate settlement message, at step S77240, the first user device 6104 may verify the partially signed first initiate settlement message. The verification of the partially signed first initiate settlement message may be similar to the description of step S77228 of FIG. 72C, the description of which applying herein. In embodiments, the first user device 6104 may not be able to verify the partially signed first initiate settlement message. If the partially signed first initiate settlement message is not verified, in embodiments, the first user device 6104 may generate a second partially signed second initiate settlement message and continue the process described in connection with FIG. 72C. In embodiments, step S77240 may be omitted.

In embodiments, the partially signed first initiate settlement message may be verified by the first user device 6104. At step S77242, the first user device 6104 may generate a first digitally signed first initiate settlement message. The first user device 6104 may generate the digitally signed initiate settlement message by digitally signing the partially signed first initiate settlement message with the customer private key.

Once the digitally signed initiate settlement message is generated, in embodiments, the first user device 6104 may transmit the digitally signed initiate settlement message to the first smart contract address 7104 via the blockchain 6108. In embodiments the digitally signed initiate settlement message may be transmitted from the first user public address 7105 to the first smart contract address 7104.

In embodiments, receipt of the digitally signed initiate settlement message may cause the first smart contract 7102 to begin waiting for the waiting period 7200 to transpire (e.g., the first waiting period). During the waiting period 7200, at step S77246, the first user device 6104 and/or a party acting on behalf of the first customer may monitor the first smart contract address 7104 for activity (e.g., a transaction, message, etc.). In embodiments, during waiting period 7200, the digital asset exchange computer system 6102 may either dispute the digitally signed initiate settlement message (similar to the process described in connection with FIGS. 72F-72H, the description of which applying herein) or generate and send a finalize settlement message to the first smart contract address 7104.

After sending the digitally signed initiate settlement message, the first user device 6104, at step S77248, may generate a first settlement message (e.g., finalize settlement message). The first settlement message may direct the first smart contract 7102 to settle based on the initiate settlement message received by the first smart contract address 7104. In embodiments, the first settlement message may be digitally signed by the first customer private key.

After generating the first settlement message, at step S77250, the first user device 6104 may transmit the first settlement message to the first smart contract address 7104 via the blockchain. In embodiments, the first settlement message may be transmitted from the first user public address 7105. The first settlement message, in embodiments, may cause the first smart contract 7102 to settle. In embodiments, the first settlement message may be transmitted prior to the waiting period 7200 transpiring. In embodiments, if the first settlement message is sent too soon, the first smart contract 7102 may generate and send a failed notification, indicating that the first settlement message was sent prior to the waiting period 7200 transpiring and/or the first settlement message has been rejected. In embodiments, the failed notification may be sent to one or more of the following: the first user public address, the first exchange public address 7109, and/or the second exchange public address 7110, to name a few. In embodiments, a second settlement message may be required if the first settlement message was rejected.

In embodiments, the first settlement message may be transmitted contemporaneous with or after the waiting period 7200 has transpired. The first settlement message, in embodiments, may cause the first smart contract 7102 to settle. At step S77252, the first customer public address may receive a first customer payment (e.g., the fourth amount of digital asset).

In embodiments, the steps of FIGS. 72A-72H may be rearranged or omitted.

Referring to the process illustrated in connection with FIGS. 73A-73D, in embodiments, the process of trading on a digital asset exchange 6110 using bi-directional channels and a smart contract via an application programing interface (API) 6107 may begin at step S77302. At step S77302, non-custodial trading information 7106 may be provided by the digital asset exchange computer system 6102 to one or more devices associated with one or more customers of the digital asset exchange 6110. In embodiments, to provide the non-custodial trading information 7106, the digital asset exchange computer system 6102 may transmit the non-custodial trading information 7106 to the first user device 6104 via network 125. In embodiments, to provide the non-custodial trading information 7106, the digital asset exchange computer system 6102 may publish the non-custodial trading information 7106 on a website associated with the digital asset exchange 6110.

In embodiments, the digital asset exchange computer system may authenticate an access request received by the first user device 6104. The process of authenticating an access request may begin by receiving an authentication request from the first user device 6104. In embodiments, the authentication request may include first customer credential information. The first customer credential information may include one or more of the following: first customer log-in credentials and/or the first customer public key, to name a few. The first customer log-in credentials may include one or more of the following. a username and password combination; biometric data (e.g., a finger print, facial recognition, etc.), an electronic mail address, a telephone number, a social security number, a partial social security number, a government issued identification number, a shape, and/or a code, to name a few. After receiving the authentication request, in embodiments, the digital asset exchange computer system 6102 verifies the that the customer is authorized to access the digital asset exchange computer system 6102. Once the customer is verified and/or identified, in embodiments, the digital asset exchange computer system 6102 may verify that the customer is a registered user of the digital asset exchange based at least in part on the first customer credential information. If either the user is not verified and/or not registered, the digital asset exchange computer system may generate and send a failed notification to the first user device 6104. The failed notification, in embodiments, may indicate that the user credential information is incorrect and/or the user is not a registered user of the digital asset exchange 6110. In embodiments, logging into the digital asset exchange computer system 6104 may be accomplished through a mobile device operating a mobile application associated with the digital asset exchange 6110. In embodiments, logging into the digital asset exchange computer system 6104 may give the customer access to the non-custodial trading information and/or the GUI illustrated in connection with FIG. 71D.

The process of FIGS. 73A-73D may continue with step S77304. At step S77304, the digital asset exchange computer system 6102 may receive a non-custodial trading request. The non-custodial trading request described herein may be similar to the non-custodial trading request described above in connection with FIGS. 72A and 71D, the descriptions of which applying herein.

The process of FIGS. 73A-73D may continue with step S77306. At step S77306, the digital asset exchange computer system 6102 may verify the non-custodial trading request. In embodiments, the digital asset exchange computer system 6102 may verify one or more of the following: the first smart contract address 7104 is an authorized smart contract address; the first smart contract instructions 7108 are authorized instructions, the first user public address 7105 is an authorized public address associated with the first user device 6104, the first exchange public address 7109 is an authorized public address, and/or the second exchange public address 7110 is an authorized public address, to name a few. If one or more of pieces of information in the non-custodial trading request are not verified, the digital asset exchange computer system may generate and send a failed notification to the first user device 6104 via network 125. The failed notification may indicate that the non-custodial trading request cannot be verified and/or what part of the non-custodial trading request is not verified.

In embodiments, the non-custodial trading request is verified. At step S77308, an initial channel state may be received by the digital asset exchange computer system 6102 from the first user device 6104. Step S77308 may be similar to the description of step S77212, the description of which applying herein.

The process may continue with step S77310. At step S77310, the digital asset exchange computer system may confirm: (1) that the first smart contract 7102 has been published on the blockchain 6108 and/or (2) the first amount of digital asset was received by the first smart contract 7102. The verification of the first smart contract 7102 and the deposit of the first amount of digital asset may be similar to the description of step S6316 described above in connection with FIG. 63B and the process described above in connection with FIG. 63E, the descriptions of which applying herein.

In embodiments, once the deposit of the first amount of digital asset is confirmed, the digital asset exchange computer system 6102 may deposit collateral into the first smart contract 7102. In embodiments, the collateral may be used to impose penalty fees on the digital asset exchange computer system 6102 in accordance with the first smart contract instructions 7108. In embodiments, the collateral may be deposited by generating a transaction request to transfer the collateral from a public address associated with the digital asset exchange 6110 to the first smart contract address 7104. In embodiments, the transaction request may be digitally signed by an exchange private key. In embodiments, if no penalty fee is imposed on the digital asset exchange 6110, the settlement of the first smart contract 7102 may cause the deposited collateral to return to the public address associated with the digital asset exchange 6110.

In embodiments, the digital asset exchange computer system may generate a first exchange mathematical puzzle and a corresponding first exchange mathematical solution. In embodiments, generating a first exchange mathematical puzzle and a corresponding first exchange mathematical solution as described herein may be similar to the description of step S6304 described above in connection with FIG. 63A, the description of which applying herein.

The process may continue with step S77312. At step S77312, the digital asset exchange computer system 6102 may receive a first order from the first user device 6104 via network 125 and/or API 6107. In embodiments, the first order may be to transfer a second amount of digital asset on the digital asset exchange. In embodiments, the second amount may be less than or equal to the first amount. The first order may be similar to the first order described in connection with the processes of FIGS. 63A-F, 64, 62A-E, and 72A-H, the descriptions of which applying herein.

The process may continue with step S77314. At step S77314, the digital asset exchange computer system 6102 may receive a first transaction request from the first user device 6104 via network 125 and/or API6107. The first transaction request may be digitally signed by the first customer private key and include one or more of the following: (1) a first transfer of the second amount of digital asset from the first smart contract address 7104 to the first exchange public address 7109; (2) a second transfer of a third amount of digital asset from the first smart contract address 7104 to the second exchange public address 7110 (the third amount, for example, corresponding to a trading fee); (3) a third transfer of a fourth amount of digital asset from the first smart contract address 7104 to the first user public address 7105 (the fourth amount of digital asset may correspond to the first amount of digital asset less the sum of the second and third amount of digital asset); and/or (4) a first customer mathematical puzzle. In embodiments, the first transaction request may include a timestamp indicating the time at which the first transaction request was transmitted to and/or received by the digital asset exchange computer system 6102.

In embodiments, the initial channel state, first order, and/or first transaction request may be received together and/or contemporaneously. In embodiments, the first order may be received before the first transaction request. In embodiments, the first transaction request may be received before the first order.

The process may continue with step S77316. At step S77316, the digital asset exchange computer system 6102 may verify the first order and/or the first transaction request. The first order may be verified, in embodiments, by verifying that the second amount is less than or equal to the first amount. In embodiments, the first transaction request may be verified by verifying that the first amount equals the sum of the second, third, and fourth amount. In embodiments, the first transaction request may be verified by verifying that the transaction request is digitally signed by the first customer private key The process may continue with FIG. 73B. Referring to FIG. 73B, at step S77318, the digital asset exchange computer system 6102 may store the first order, the first transaction request, and/or the initiate channel state. In embodiments, the first order, first transaction request, and/or the initial channel state may be stored by the digital asset exchange computer system 6102 in memory 6102-C as the first order, first transaction request, and/or initial channel state are received respectively.

The process may continue with Step S77320. At step S77320, the first order is executed by the digital asset exchange computer system 6102. Once executed, in embodiments, the record of the execution may be stored in a transaction log. The transaction log may, in embodiments, be made available to the first customer for the purposes of verifying the execution of the first order. In embodiments, the digital asset exchange computer system 6102 may generate and send a confirmation message to the first user device 6104 via the network 125 and/or API 6107. The confirmation message, in embodiments, may indicate the first order was executed. In embodiments, the first order may not be executed because of a lack of an entity willing to buy the second amount of digital asset on the digital asset exchange 6110. In those embodiments, the digital asset exchange computer system 6102 may generate and send a message indicating that the first order was not executed to the first user device 6104 via the network 125 and/or API 6107.

In embodiments, the customer may transmit additional orders and transaction requests via the network 125 and/or API 6107, which may result in the repetition of steps S77312 through S77320 for each order/transaction request combination. For example, the digital asset exchange computer system 6102 may receive a second order from the first user device 6104. The second order may be to transfer a fifth amount of digital asset on the digital asset exchange computer system. In embodiments, the fifth amount is less than or equal to the fourth amount. The digital asset exchange computer system 6102 may also receive a second transaction request from the first user device 6104.

The second transaction request may be digitally signed by the first customer private key and include one or more of the following: (1) a first transfer of the second amount of digital asset from the first smart contract address 7104 to the first exchange public address 7109; (2) a second transfer of a third amount of digital asset from the first smart contract address 7104 to the second exchange public address 7110

(the third amount, for example, corresponding to a trading fee); (3) a third transfer of a fourth amount of digital asset from the first smart contract address 7104 to the first user public address 7105 (the fourth amount of digital asset may correspond to the first amount of digital asset less the sum of the second and third amount of digital asset); (4) a fifth transfer of a sixth amount of digital asset from the first smart contract address 7104 to the second exchange public address 7110 (the sixth amount, for example, corresponding to a trading fee); (5) a sixth transfer of a seventh amount of digital asset from the first smart contract address 7104 to the first user public address 7105 (the seventh amount of digital asset may correspond to the fourth amount of digital asset less the sum of the fifth and sixth amount of digital asset); and/or (6) a second customer mathematical puzzle.

In embodiments, each transaction request includes each transfer during the trading session, including the transfers from previous transaction requests except for the transfer to the public address associated with the customer where the most up to date transaction will only include one transfer to the customer public address (e.g., the amount of digital asset left over after the trades on the digital asset exchange have been executed). In embodiments, the second transaction request is identified as the most recent transaction request by the second customer mathematical puzzle. In embodiments, the second transaction request may include a timestamp indicating the time at which the first transaction request was transmitted to and/or received by the digital asset exchange computer system 6102.

In embodiments, second order, and/or second transaction request may be received together and/or contemporaneously. In embodiments, the second order may be received before the second transaction request. In embodiments, the second transaction request may be received before the second order.

Continuing the example, in embodiments, the digital asset exchange computer system 6102 may verify the second order and/or the second transaction request. The second order may be verified, in embodiments, by verifying that the fifth amount is less than or equal to the fourth amount. In embodiments, the second transaction request may be verified by verifying that the first amount equals the sum of the second, third, fifth, sixth, and seventh amount. In embodiments, the second transaction request may be verified by verifying that the transaction request is digitally signed by the first customer private key.

Continuing the example, the digital asset exchange computer system 6102 may store the second order and/or the second transaction request. In embodiments, the second order and/or the second transaction request may be stored by the digital asset exchange computer system 6102 in memory 6102-C as the second order and/or the second transaction request are received, respectively.

Continuing the example, the digital asset exchange computer system 6102 may execute the second order and/or generate and send a confirmation message to the first use device 6104.

Figure 73A:
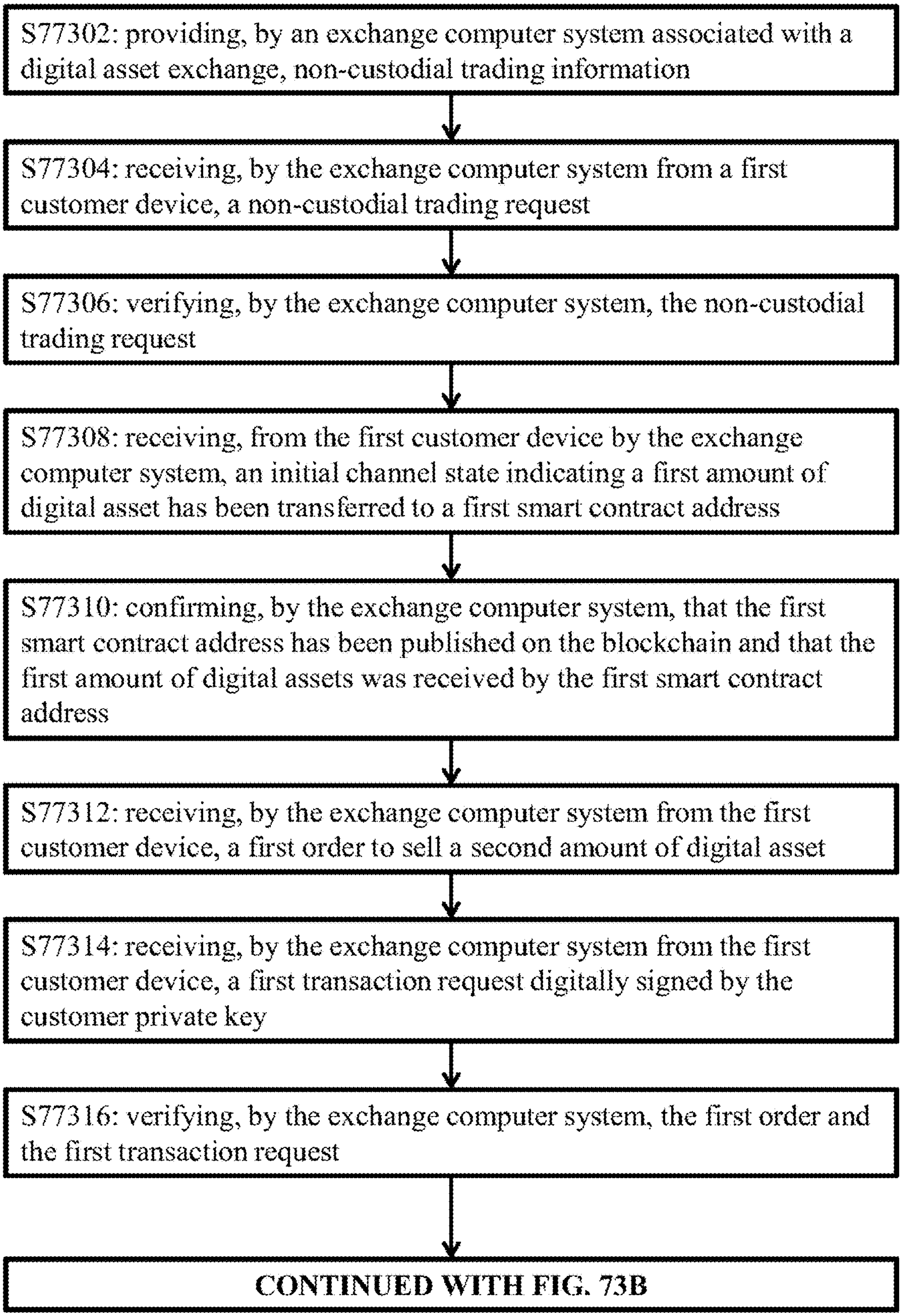
Figure 73B:
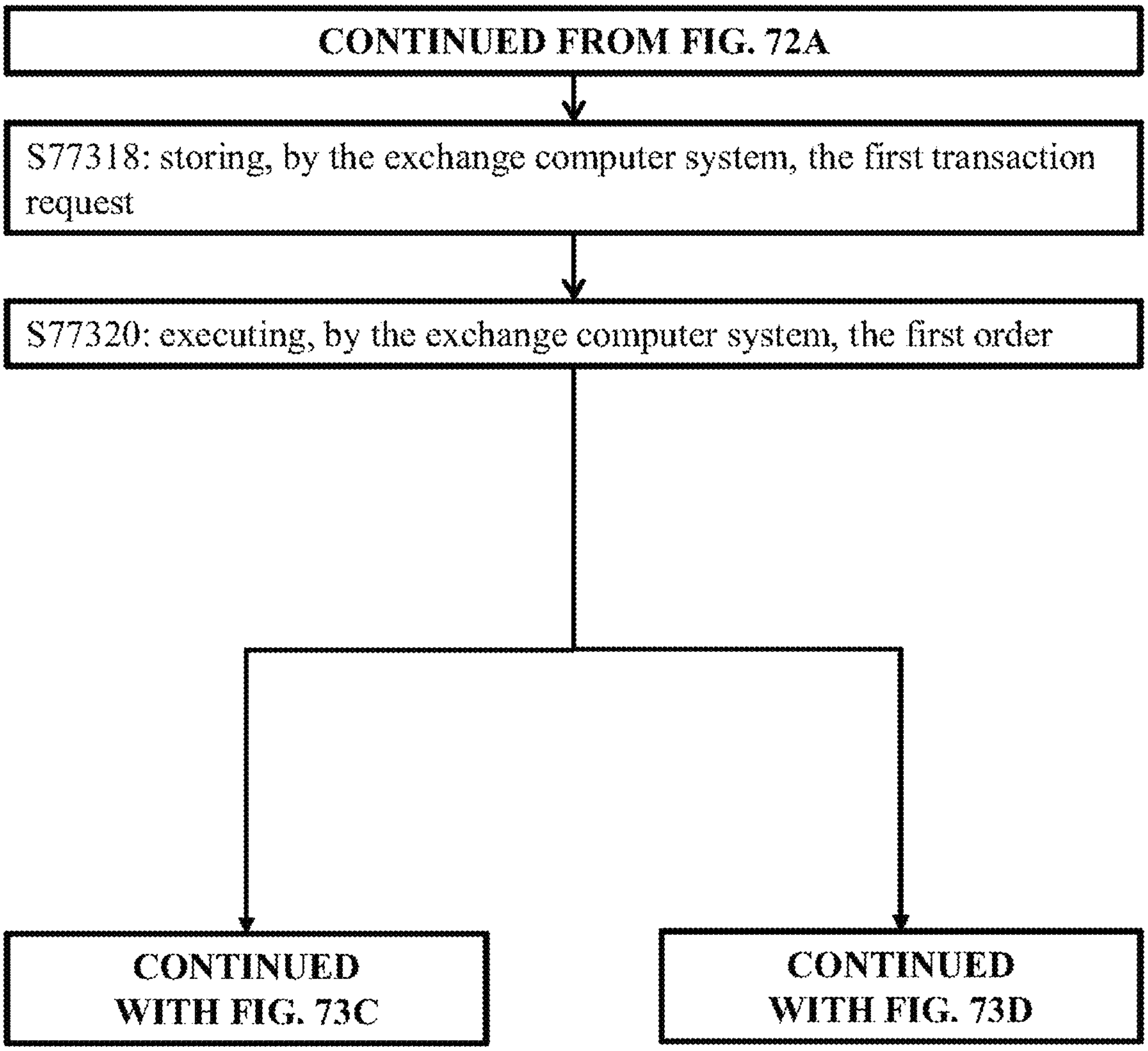
Figure 73C:
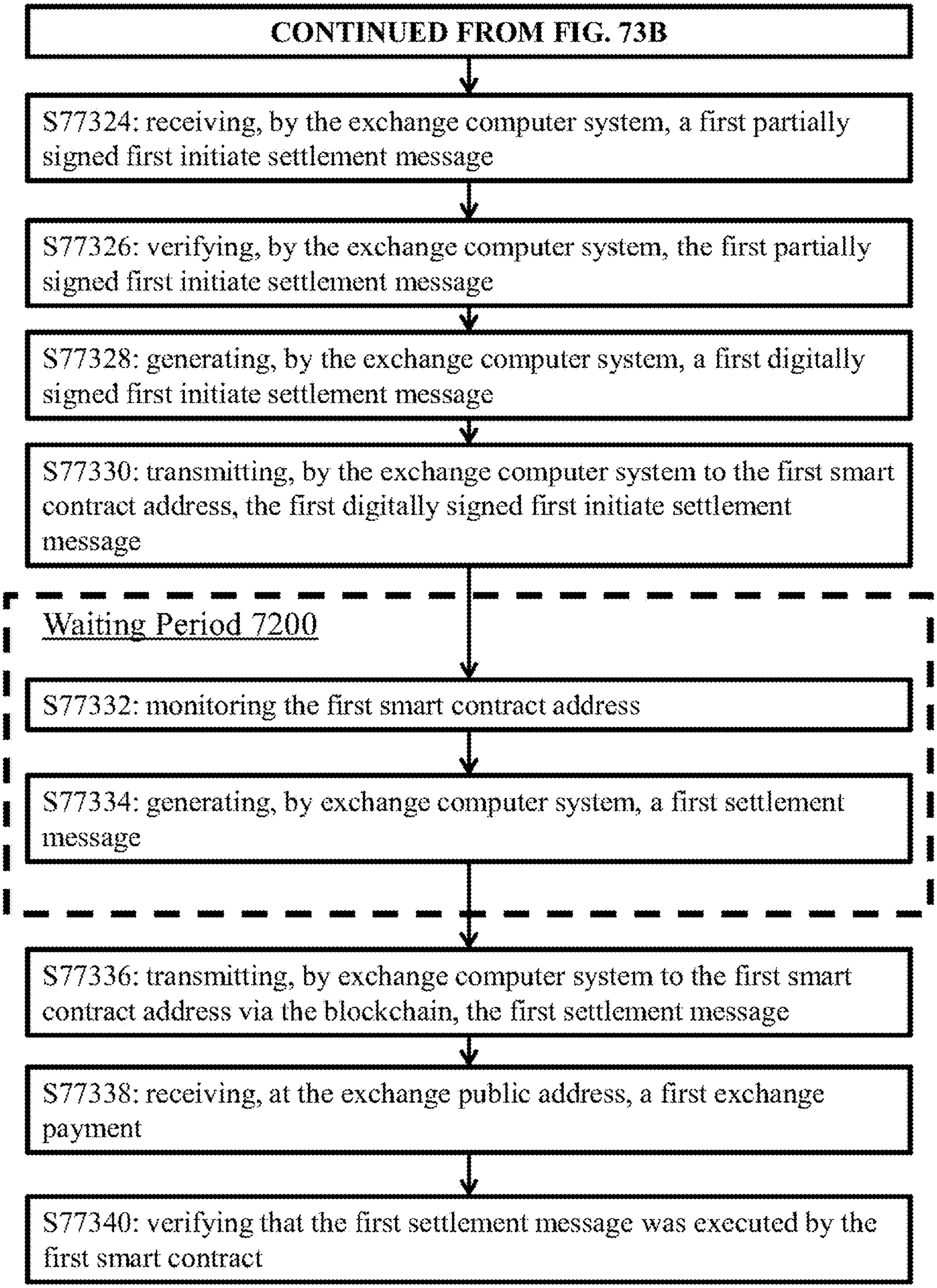

The process of FIGS. 73A-73D may continue with FIG. 73C. Referring to FIG. 73C, the process may continue with step S77324. At step S77324, the digital asset exchange computer system 6102 may receive a first partially signed first initiate settlement agreement.

In embodiments, the partially signed first initiate settlement message may be received by the digital asset exchange computer system 6102 from the first user device 6104 via network 125 and/or API 6107. After receiving the partially signed first initiate settlement message, at step S77326, the digital asset exchange computer system 6102 may verify the partially signed first initiate settlement message. The verification of the partially signed first initiate settlement message may be similar to the description of step S77228 of FIG. 72C, the description of which applying herein. In embodiments, the digital asset exchange computer system 6102 may not be able to verify the partially signed first initiate settlement message. If the partially signed first initiate settlement message is not verified, in embodiments, the digital asset exchange computer system 6102 may generate a second partially signed second initiate settlement message and continue the process described in connection with FIG. 73D. In embodiments, step S77326 may be omitted.

In embodiments, the partially signed first initiate settlement message may be verified by the digital asset exchange computer system 6102. At step S77328, the digital asset exchange computer system 6102 may generate a first digitally signed first initiate settlement message. The digital asset exchange computer system 6102 may generate the digitally signed initiate settlement message by digitally signing the partially signed first initiate settlement message with the exchange private key.

Once the digitally signed initiate settlement message is generated, in embodiments, at step S77330, the digital asset exchange computer system 6102 may transmit the digitally signed initiate settlement message to the first smart contract address 7104 via the blockchain 6108. In embodiments the digitally signed initiate settlement message may be transmitted from the first exchange public address 7109 and/or the second exchange public address 7110 to the first smart contract address 7104.

In embodiments, receipt of the digitally signed initiate settlement message may cause the first smart contract 7102 to begin waiting for the waiting period 7200 to transpire (e.g., the first waiting period). During the waiting period 7200, at step S77332, the digital asset exchange computer system 6102 and/or a party acting on behalf of the digital asset exchange 6110 may, at step S77332, monitor the first smart contract address 7104 for activity (e.g., a transaction, message, etc.). In embodiments, during waiting period 7200, the first user device 6104 may either dispute the digitally signed initiate settlement message (similar to the process described in connection with FIGS. 72F-72H, the description of which applying herein) or generate and send a finalize settlement message to the first smart contract address 7104.

After sending the digitally signed initiate settlement message, the digital asset exchange computer system 6102, at step S77334, may generate a first settlement message (e.g., finalize settlement message). The first settlement message may direct the first smart contract 7102 to settle based on the initiate settlement message received by the first smart contract address 7104. In embodiments, the first settlement message may be digitally signed by the exchange private key.

After generating the first settlement message, at step S77336, the digital asset exchange computer system 6102 may transmit the first settlement message to the first smart contract address 7104 via the blockchain. In embodiments, the first settlement message may be transmitted from the first exchange public address 7109 and/or the second exchange public address 7110. The first settlement message, in embodiments, may cause the first smart contract 7102 to settle. In embodiments, the first settlement message may be transmitted prior to the waiting period 7200 transpiring. In embodiments, if the first settlement message is sent too soon, the first smart contract 7102 may generate and send a failed notification, indicating that the first settlement message was sent prior to the waiting period 7200 transpiring and/or the first settlement message has been rejected. In embodiments, the failed notification may be sent to one or more of the following: the first user public address, the first exchange public address 7109, and/or the second exchange public address 7110, to name a few. In embodiments, a second settlement message may be required if the first settlement message was rejected.

In embodiments, the first settlement message may be transmitted contemporaneous with or after the waiting period 7200 has transpired. The first settlement message, in embodiments, may cause the first smart contract 7102 to settle. At step S77338, the first exchange public address 7109 and/or the second exchange public address 7110 may receive a first exchange payment (e.g., the second and third amount of digital asset, or, from the example, the second, third, fifth, and sixth amount of digital asset).

The process may continue with step S77340. At step S77340, the digital asset exchange computer system 6102 may verify the first settlement message was executed by the first smart contract 7102. Verification, in embodiments, may include verifying that the correct amount of digital assets was received by the first user public address 7105, the first exchange public address 7109 and/or the second exchange public address 7110.

Figure 73D:
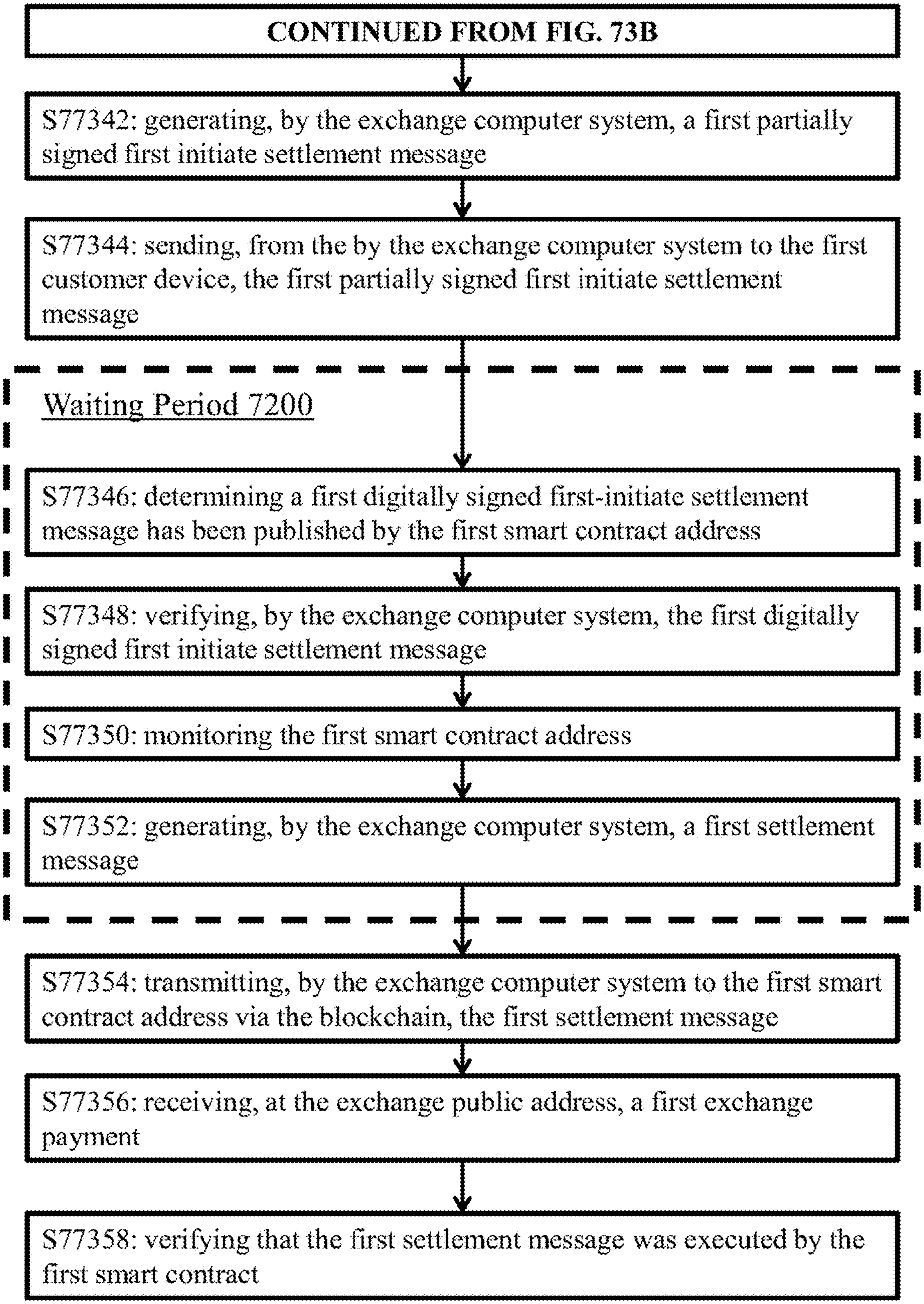

Referring back to FIG. 73B, the process of FIGS. 73A-73D may continue with FIG. 73D. Referring to FIG. 73D, the process may continue with step S77342. At step S77342, the digital asset exchange computer system 6102 may generate a first partially signed first initiate settlement message. To initiate settlement when the non-custodial trading session has expired, an initiate settlement message digitally signed by the first customer private key and the digital asset exchange private key may be sent to the first smart contract address 7104. A partially signed initiate settlement message, in embodiments, may include one or more of the following: (1) a customer payment amount indicating a final amount of digital asset owned by the customer and/or in the custody of the first smart contract 7102; (2) an exchange payment amount indicating a final amount of digital asset owned by the digital asset exchange 6110 and/or in the custody of the first smart contract 7102; (3) a customer digital signature or an exchange digital signature (e.g., partially signed); and/or (4) a most recent mathematical puzzle associated with the digital asset exchange computer system 6102 and/or the first user device 6104, to name a few. The most recent mathematical puzzle, in embodiments, may be used alternatively or in combination with a timestamp.

Once generated, at step S77344, the digital asset exchange computer system 6102 may transmit the partially signed first initiate settlement message to the first user device 6104 via network 125 and/or API 6107. After the first user device 6104 receives the first partially signed initiate settlement message, first user device 6104 may verify the first partially signed first initiate settlement message (see e.g., step S77228 of FIG. 72C, the description of which applying herein). In embodiments, the first user device 6104 may not verify the first partially signed initiate settlement message. If the first partially signed initiate settlement message is not verified, in embodiments, the process may continue with FIG. 72C and/or restarting the process of FIG. 73D. In embodiments, if the first partially signed initiate settlement message is verified by the first user device 6104, the first user device 6104 may digitally sign the first partially signed initiate settlement message, generating a digitally signed first initiate settlement message. In embodiments, the digitally signed first initiate settlement message may be transmitted by the first user device 6104 to the first smart contract address 7104 via the blockchain 6108.

Continuing the process of FIG. 73D, at step S77346, it is determined that the first digitally signed initiate settlement message has been received by the first smart contract address 7104. This determination, in embodiments, may be made by one or more of the following: the digital asset exchange computer system 6102, a confirmation message received by the digital asset exchange computer system 6102 from the first user device 6104; and/or a trusted third party notifying the digital asset exchange computer system 6102, to name a few. The receipt of the digitally signed initiate settlement message may, in embodiments, trigger the waiting period 7200 (e.g., the first waiting period).

In embodiments, during waiting period 7200 at step S77228, the first digitally signed first initiate settlement message may be verified by the digital asset exchange computer system 6102. In embodiments, the digital asset exchange computer system 6102 may verify that the payment amounts—e.g., the second amount and the third amount going to the digital asset exchange 6110 and the fourth amount going to the first user public address 7105—are correct. In embodiments, the payment amounts may be incorrect—e.g., the amount being transferred to the first user is incorrect and/or the amount being transferred to the digital asset exchange 6110 is incorrect, the process may continue with the dispute process of FIG. 72F. The verification may be completed by a trusted third party, digital asset exchange computer system 6102, and/or the first user device 6104, to name a few.

In embodiments, the digitally signed initiate settlement message may be verified. In embodiments, during the waiting period 7200, at step S77350, the first smart contract address 7104 may be monitored by the digital asset exchange computer system 6102, a trusted third party, and/or an entity operating on behalf of the first customer and/or digital asset exchange 6110, to name a few. In embodiments, the monitoring may occur in substantially real-time during the first waiting period. The monitoring, in embodiments, may be to determine if another transaction request and/or message has been sent to the first smart contract address 7104.

Continuing the process, at step S77352, the digital asset exchange computer system 6102 may generate a first settlement message (e.g., a finalize settlement message). The first settlement message may direct the first smart contract 7102 to settle based on the initiate settlement message received by the first smart contract address 7104. In embodiments, the first settlement message may be digitally signed by the exchange private key.

After generating the first settlement message, at step S77354, the digital asset exchange computer system 6102 may transmit the first settlement message to the first smart contract address 7104 via the blockchain. In embodiments, the first settlement message may be transmitted from the first exchange public address 7109 and/or the second exchange public address 7110. The first settlement message, in embodiments, may cause the first smart contract 7102 to settle.

In embodiments, because the first user device 6104 sent the initiate settlement message, the digital asset exchange 6110 may not have to wait until the first waiting period has transpired. The first waiting period, in embodiments, may allow for a customer and/or digital asset exchange 6110 to dispute the initiate settlement message. Thus, the party that did not send the message, in embodiments, may be the party to use the first waiting period to verify and/or dispute the initiate settlement message.

In embodiments, alternative to generating and sending a settlement message, the digital asset exchange computer system 6102 may send a message and/or notification to the first user device 6104, indicating that the customer verified the initiate settlement message and would like to finalize the settlement. In embodiments, in response to the message and/or notification, the first user device 6104 may generate and send a first settlement message to the first smart contract address 7104 via the blockchain 6108.

Continuing the process, the first smart contract 7102 may settle and transfer: the fourth amount of digital asset to the first user public address 7105, the second amount of digital asset to the first exchange public address 7109, and/or the third amount of digital asset to the second exchange public address 7110. At step S77236, the first user public address 7105 may receive the first customer payment (e.g., the fourth amount of digital asset).

In embodiments, the first settlement message may be transmitted contemporaneous with or after the waiting period 7200 has transpired. The first settlement message, in embodiments, may cause the first smart contract 7102 to settle. At step S77356, the first exchange public address 7109 and/or the second exchange public address 7110 may receive a first exchange payment (e.g., the second and third amount of digital asset, or, from the example, the second, third, fifth, and sixth amount of digital asset).

The process may continue with step S77358. At step S77358, the digital asset exchange computer system 6102 may verify the first settlement message was executed by the first smart contract 7102. Verification, in embodiments, may include verifying that the correct amount of digital assets was received by the first user public address 7105, the first exchange public address 7109 and/or the second exchange public address 7110.

In embodiments, the steps of FIGS. 73A-73D may be rearranged or omitted.

In embodiments, a method for conducting an electronic auction of a first digital asset pair including a first digital asset and a first fiat on a digital asset exchange computer system includes steps of: (a) on or after a first time associated with opening the electronic auction until a second time associated with closing the electronic auction, generating a first electronic auction order book for the first digital asset pair, by the digital asset exchange computer system, including: (i) receiving, by a digital asset exchange computer system from a first plurality of user devices associated with a first plurality of users, a first plurality of auction trade orders associated with the first digital asset pair, wherein each auction trade order specifies order characteristics including: (1) the first digital asset by digital asset type; (2) a respective quantity of units of the first digital asset; (3) a respective side of the transaction; and (4) a respective price in first fiat per unit of the first digital asset; (ii) for each of the first plurality of auction trade orders, verifying, by the digital asset exchange computer system, each respective first auction trade order is a qualified trade, based on the steps of: (1) verifying, by the digital asset exchange computer system, the order characteristics of the respective auction trade order are valid auction order characteristics; (2) in the case where the side of the transaction is buy, verifying, by the digital asset exchange computer system, the respective user has sufficient amounts of the first fiat to cover the first auction trade order if filled in full; (3) in the case where the side of the transaction is sell, verifying, by the digital asset exchange computer system, the respective user has sufficient amounts of the first digital asset to cover the first auction trade order if filled in full; (iii) upon successful verification of each respective auction trade order in step (a)(ii), the steps of: (1) updating, by the digital asset exchange computer system, each respective user account associated with each respective user to set aside sufficient reserves in the first digital asset or the first fiat, as applicable, sufficient to cover each respective auction trade order which has been successfully verified if filled in full; and (2) storing in first electronic auction order book, by the digital asset exchange computer system on one or more computer readable mediums, each respective auction trade order which has been successfully verified; (b) for at least a first time period starting with a third time associated with the opening of an indicative auction publication, and continuing at least until the second time, obtaining, by the digital asset exchange computer system, blended digital asset pricing information comprising, for each of a plurality of fourth times between the third time and the second time, a respective blended digital asset price at each respective fourth time calculated by a volume weighted average of executed trading data for a second time period preceding the respective fourth time through the fourth time, of the first digital asset for the first fiat from a plurality of specified digital asset exchanges for the respective second time period, wherein the executed trading data excludes (i) a first fixed percentage of the highest priced trades of the first digital asset pair on the plurality of specified digital asset exchanges during the second time period, and (ii) a second fixed percentage of the lowest priced trades of the first digital asset pairs on the plurality of specified digital asset exchanges during the second time period; (c) starting with the third time and continuing until the second time, electronically publishing, by the digital asset exchange computer system, at set time intervals between the third time and the second time, respective indicative results of the first auction order book if the auction were to close at the end of each respective time interval, wherein the respective indicative results include: (i) a respective highest bid price, which is calculated, by the digital asset exchange computer system, using the first auction order book, by determining the highest bid price in first fiat per unit of first digital asset included in the first auction order book at the end of each respective time interval; (ii) a respective lowest ask price, which is calculated, by the digital asset exchange computer system, using the first auction order book, by determining the lowest ask price in first fiat per unit of first digital asset included in the first auction order book at the end of each respective time interval; (iii) a respective indicative price, which is calculated, as of a respective sixth time, by: (1) determining, by the digital asset exchange computer system, using the first auction order book, a respective indicative auction price in terms of the first fiat for the first digital asset that will execute the greatest quantity of the first digital assets being transacted for the first fiat; (2) in the case where more than one respective indicative auction price is identified as having the same greatest quantity of the first digital assets being transaction for the first fiat, selecting as the respective indicative auction price by applying the following order of priority: (A) the indicative auction price which is closest to the blended digital asset price for the respective sixth time; (B) the midpoint of the two adjacent indicative auction prices identified for the sixth time; (iv) a respective auction quantity, which is determined by the digital asset exchange computer system, as the quantity of units of the first digital asset which would match the respective indicative price as of the sixth time; (d) at the second time, close the first auction order book, by the digital asset exchange computer system, and stop accepting new auction orders to be added to the first auction order book; (e) after step (d), calculating, by the digital asset exchange computer system, a collar price range by: (i) obtaining, by the digital asset exchange, the blended digital asset price for the second time; (ii) determining, by the digital asset exchange computer system, the minimum collar as the blended digital asset price for the second time less a third fixed percentage of the blended digital asset price for the second time; and (iii) determining, by the digital asset exchange computer system, the maximum collar as the blended digital asset price for the second time plus a fourth fixed percentage of the blended digital asset price for the second time; (f) after step (e), calculating, by the digital asset exchange computer system, final results of the first auction order book, wherein the final results include: (i) a final auction price at the second time, which is calculated by: (1) determining, by the digital asset exchange computer system, using the first auction order book at the second time, a final auction price in terms of the first fiat for the first digital asset that will execute the greatest quantity of the first digital assets being transacted for the first fiat; (2) in the case where more than one respective final auction price is identified as having the same greatest quantity of the first digital assets being transaction for the first fiat, selecting as the respective final auction price by applying the following order of priority: (A) the final auction price which is closest to the blended digital asset price for the second time; (B) the midpoint of the two adjacent final auction prices for the second time; (ii) a final auction quantity, which is determined by the digital asset exchange computer system, as the quantity of units of the first digital asset which match the final auction price as of the second time; (g) verifying, by the digital asset exchange computer system, that the final auction price is greater than or equal to the minimum collar price and less than or equal to the maximum collar price; (h) in the case where the final auction price is verified to be greater than or equal to the minimum collar price and less than or equal to the maximum collar price, electronically publishing the final auction price and the final auction quantity as the results of the auction along with the second time; and (i) in the case where the final auction price is not verified to be greater than or equal to the minimum collar price and less than or equal to the maximum collar price, electronically publishing the auction failed along with the second time.

In embodiments, the first digital asset is a digital math-based asset.

In embodiments, the first digital asset is one of BITCOIN, Ether, Litecoin, BITCOIN Cash or Ripple.

In embodiments, the first digital asset is a token.

In embodiments, the first fiat is U.S. dollars.

In embodiments, the third time is 10 minutes prior to the second time.

In embodiments, each of the plurality of fourth times are one minute apart from each other.

In embodiments, the executed trading data is received from a respective continuous order book of each of the plurality of specified digital asset exchanges.

In embodiments, the plurality of specified digital asset exchanges includes a digital asset exchange associated with the digital asset exchange computer system.

In embodiments, a method for conducting an electronic auction of a first digital asset pair including a first digital asset and a second digital asset on a digital asset exchange computer system includes steps of: (a) on or after a first time associated with opening the electronic auction until a second time associated with closing the electronic auction, generating a first electronic auction order book for the first digital asset pair, by the digital asset exchange computer system, including: (i) receiving, by a digital asset exchange computer system from a first plurality of user devices associated with a first plurality of users, a first plurality of auction trade orders associated with the first digital asset pair, wherein each auction trade order specifies order characteristics including: (1) the first digital asset by digital asset type; (2) a respective quantity of units of the first digital asset; (3) a respective side of the transaction; and (4) a respective price in units of the second digital asset per unit of the first digital asset; (ii) for each of the first plurality of auction trade orders, verifying, by the digital asset exchange computer system, each respective first auction trade order is a qualified trade, based on the steps of: (1) verifying, by the digital asset exchange computer system, the order characteristics of the respective auction trade order are valid auction order characteristics; (2) in the case where the side of the transaction is buy, verifying, by the digital asset exchange computer system, the respective user has sufficient amounts of the second digital asset to cover the first auction trade order if filled in full; (3) in the case where the side of the transaction is sell, verifying, by the digital asset exchange computer system, the respective user has sufficient amounts of the first digital asset to cover the first auction trade order if filled in full; (iii) upon successful verification of each respective auction trade order in step (a)(ii), the steps of: (1) updating, by the digital asset exchange computer system, each respective user account associated with each respective user to set aside sufficient reserves in the first digital asset or the second digital asset, as applicable, sufficient to cover each respective auction trade order which has been successfully verified if filled in full, and (2) storing in first electronic auction order book, by the digital asset exchange computer system on one or more computer readable mediums, each respective auction trade order which has been successfully verified; (b) for at least a first time period starting with a third time associated with the opening of an indicative auction publication, and continuing at least until the second time, obtaining, by the digital asset exchange computer system, blended digital asset pricing information comprising, for each of a plurality of fourth times between the third time and the second time, a respective blended digital asset price at each respective fourth time calculated by a volume weighted average of executed trading data for a second time period preceding the respective fourth time through the fourth time, of the first digital asset for the second digital asset from a plurality of specified digital asset exchanges for the respective second time period, wherein the executed trading data excludes (i) a first fixed percentage of the highest priced trades of the first digital asset pair on the plurality of specified digital asset exchanges during the second time period, and (ii) a second fixed percentage of the lowest priced trades of the first digital asset pairs on the plurality of specified digital asset exchanges during the second time period; (c) starting with the third time and continuing until the second time, electronically publishing, by the digital asset exchange computer system, at set time intervals between the third time and the second time, respective indicative results of the first auction order book if the auction were to close at the end of each respective time interval, wherein the respective indicative results include: (i) a respective highest bid price, which is calculated, by the digital asset exchange computer system, using the first auction order book, by determining the highest bid price in units of the second digital asset per unit of first digital asset included in the first auction order book at the end of each respective time interval; (ii) a respective lowest ask price, which is calculated, by the digital asset exchange computer system, using the first auction order book, by determining the lowest ask price in units of the second digital asset per unit of first digital asset included in the first auction order book at the end of each respective time interval; and (iii) a respective indicative price, which is calculated, as of a respective sixth time, by: (1) determining, by the digital asset exchange computer system, using the first auction order book, a respective indicative auction price in terms of the second digital asset for the first digital asset that will execute the greatest quantity of the first digital assets being transacted for the second digital assets; (2) in the case where more than one respective indicative auction price is identified as having the same greatest quantity of the first digital assets being transaction for the second digital assets, selecting as the respective indicative auction price by applying the following order of priority: (A) the indicative auction price which is closest to the blended digital asset price for the respective sixth time; (B) the midpoint of the two adjacent indicative auction prices identified for the sixth time; (i) a respective auction quantity, which is determined by the digital asset exchange computer system, as the quantity of units of the first digital asset which would match the respective indicative price as of the sixth time, (d) at the second time, close the first auction order book, by the digital asset exchange computer system, and stop accepting new auction orders to be added to the first auction order book; (e) after step (d), calculating, by the digital asset exchange computer system, a collar price range by: (i) obtaining, by the digital asset exchange, the blended digital asset price for the second time; (ii) determining, by the digital asset exchange computer system, the minimum collar as the blended digital asset price for the second time less a third fixed percentage of the blended digital asset price for the second time; and (iii) determining, by the digital asset exchange computer system, the maximum collar as the blended digital asset price for the second time plus a fourth fixed percentage of the blended digital asset price for the second time; (f) after step (e), calculating, by the digital asset exchange computer system, final results of the first auction order book, wherein the final results include: (i) a final auction price at the second time, which is calculated by: (1) determining, by the digital asset exchange computer system, using the first auction order book at the second time, a final auction price in terms of the second digital asset for the first digital asset that will execute the greatest quantity of the first digital assets being transacted for the second digital assets; (2) in the case where more than one respective final auction price is identified as having the same greatest quantity of the first digital assets being transaction for the second digital asset, selecting as the respective final auction price by applying the following order of priority: (A) the final auction price which is closest to the blended digital asset price for the second time; (B) the midpoint of the two adjacent final auction prices for the second time; (ii) a final auction quantity, which is determined by the digital asset exchange computer system, as the quantity of units of the first digital asset which match the final auction price as of the second time; (g) verifying, by the digital asset exchange computer system, that the final auction price is greater than or equal to the minimum collar price and less than or equal to the maximum collar price; (h) in the case where the final auction price is verified to be greater than or equal to the minimum collar price and less than or equal to the maximum collar price, electronically publishing the final auction price and the final auction quantity as the results of the auction along with the second time; and (i) in the case where the final auction price is not verified to be greater than or equal to the minimum collar price and less than or equal to the maximum collar price, electronically publishing the auction failed along with the second time.

In embodiments, the first digital asset is a digital math-based asset.

In embodiments, the first digital asset is one of BITCOIN, Ether, Litecoin, BITCOIN Cash or Ripple.

In embodiments, the first digital asset is a token.

In embodiments, the second digital asset is a digital math-based asset.

In embodiments, the second digital asset is one of BITCOIN, Ether, Litecoin, BITCOIN Cash or Ripple.

In embodiments, the second digital asset is a token.

A digital asset exchange computer system includes (1) one or more processors; (2) a non-transitory computer-readable memory operatively connected to the one or more processors, the non-transitory computer-readable memory having stored thereon machine-readable instructions that, when executed by the one or more processors, cause the one or more processors to perform a method including: (a) on or after a first time associated with opening the electronic auction until a second time associated with closing the electronic auction, generating a first electronic auction order book for the first digital asset pair, by the digital asset exchange computer system, including: (i) receiving, by a digital asset exchange computer system from a first plurality of user devices associated with a first plurality of users, a first plurality of auction trade orders associated with the first digital asset pair, wherein each auction trade order specifies order characteristics including: (1) the first digital asset by digital asset type; (2) a respective quantity of units of the first digital asset; and (3) a respective side of the transaction; and (4) a respective price in first fiat per unit of the first digital asset; (ii) for each of the first plurality of auction trade orders, verifying, by the digital asset exchange computer system, each respective first auction trade order is a qualified trade, based on the steps of: (1) verifying, by the digital asset exchange computer system, the order characteristics of the respective auction trade order are valid auction order characteristics; (2) in the case where the side of the transaction is buy, verifying, by the digital asset exchange computer system, the respective user has sufficient amounts of the first fiat to cover the first auction trade order if filled in full; (3) in the case where the side of the transaction is sell, verifying, by the digital asset exchange computer system, the respective user has sufficient amounts of the first digital asset to cover the first auction trade order if filled in full; (iii) upon successful verification of each respective auction trade order in step (a)(ii), the steps of: (1) updating, by the digital asset exchange computer system, each respective user account associated with each respective user to set aside sufficient reserves in the first digital asset or the first fiat, as applicable, sufficient to cover each respective auction trade order which has been successfully verified if filled in full; and (2) storing in first electronic auction order book, by the digital asset exchange computer system on one or more computer readable mediums, each respective auction trade order which has been successfully verified; (b) for at least a first time period starting with a third time associated with the opening of an indicative auction publication, and continuing at least until the second time, obtaining, by the digital asset exchange computer system, blended digital asset pricing information comprising, for each of a plurality of fourth times between the third time and the second time, a respective blended digital asset price at each respective fourth time calculated by a volume weighted average of executed trading data for a second time period preceding the respective fourth time through the fourth time, of the first digital asset for the first fiat from a plurality of specified digital asset exchanges for the respective second time period, wherein the executed trading data excludes (i) a first fixed percentage of the highest priced trades of the first digital asset pair on the plurality of specified digital asset exchanges during the second time period, and (ii) a second fixed percentage of the lowest priced trades of the first digital asset pairs on the plurality of specified digital asset exchanges during the second time period; (c) starting with the third time and continuing until the second time, electronically publishing, by the digital asset exchange computer system, at set time intervals between the third time and the second time, respective indicative results of the first auction order book if the auction were to close at the end of each respective time interval, wherein the respective indicative results include: (i) a respective highest bid price, which is calculated, by the digital asset exchange computer system, using the first auction order book, by determining the highest bid price in first fiat per unit of first digital asset included in the first auction order book at the end of each respective time interval; (ii) a respective lowest ask price, which is calculated, by the digital asset exchange computer system, using the first auction order book, by determining the lowest ask price in first fiat per unit of first digital asset included in the first auction order book at the end of each respective time interval; (iii) a respective indicative price, which is calculated, as of a respective sixth time, by: (1) determining, by the digital asset exchange computer system, using the first auction order book, a respective indicative auction price in terms of the first fiat for the first digital asset that will execute the greatest quantity of the first digital assets being transacted for the first fiat; and (2) in the case where more than one respective indicative auction price is identified as having the same greatest quantity of the first digital assets being transaction for the first fiat, selecting as the respective indicative auction price by applying the following order of priority: (A) the indicative auction price which is closest to the blended digital asset price for the respective sixth time; (B) the midpoint of the two adjacent indicative auction prices identified for the sixth time; and (iv) a respective auction quantity, which is determined by the digital asset exchange computer system, as the quantity of units of the first digital asset which would match the respective indicative price as of the sixth time; (d) at the second time, closing the first auction order book, by the digital asset exchange computer system, and stop accepting new auction orders to be added to the first auction order book; (e) after step (d), calculating, by the digital asset exchange computer system, a collar price range by: (i) obtaining, by the digital asset exchange, the blended digital asset price for the second time; (ii) determining, by the digital asset exchange computer system, the minimum collar as the blended digital asset price for the second time less a third fixed percentage of the blended digital asset price for the second time; and (iii) determining, by the digital asset exchange computer system, the maximum collar as the blended digital asset price for the second time plus a fourth fixed percentage of the blended digital asset price for the second time; (f) after step (e), calculating, by the digital asset exchange computer system, final results of the first auction order book, wherein the final results include: (i) a final auction price at the second time, which is calculated by: (1) determining, by the digital asset exchange computer system, using the first auction order book at the second time, a final auction price in terms of the first fiat for the first digital asset that will execute the greatest quantity of the first digital assets being transacted for the first fiat; and (2) in the case where more than one respective final auction price is identified as having the same greatest quantity of the first digital assets being transaction for the first fiat, selecting as the respective final auction price by applying the following order of priority: (A) the final auction price which is closest to the blended digital asset price for the second time; (B) the midpoint of the two adjacent final auction prices for the second time, and (ii) a final auction quantity, which is determined by the digital asset exchange computer system, as the quantity of units of the first digital asset which match the final auction price as of the second time; (g) verifying, by the digital asset exchange computer system, that the final auction price is greater than or equal to the minimum collar price and less than or equal to the maximum collar price; (h) in the case where the final auction price is verified to be greater than or equal to the minimum collar price and less than or equal to the maximum collar price, electronically publishing the final auction price and the final auction quantity as the results of the auction along with the second time; and (i) in the case where the final auction price is not verified to be greater than or equal to the minimum collar price and less than or equal to the maximum collar price, electronically publishing the auction failed along with the second time.

A digital asset exchange computer system includes (1) one or more processors; (2) a non-transitory computer-readable memory operatively connected to the one or more processors, the non-transitory computer-readable memory having stored thereon machine-readable instructions that, when executed by the one or more processors, cause the one or more processors to perform a method including: (a) on or after a first time associated with opening the electronic auction until a second time associated with closing the electronic auction, generating a first electronic auction order book for the first digital asset pair, by the digital asset exchange computer system, including: (i) receiving, by a digital asset exchange computer system from a first plurality of user devices associated with a first plurality of users, a first plurality of auction trade orders associated with the first digital asset pair, wherein each auction trade order specifies order characteristics including: (1) the first digital asset by digital asset type; (2) a respective quantity of units of the first digital asset; (3) a respective side of the transaction; and (4) a respective price in units of the second digital asset per unit of the first digital asset; (ii) for each of the first plurality of auction trade orders, verifying, by the digital asset exchange computer system, each respective first auction trade order is a qualified trade, based on the steps of: (1) verifying, by the digital asset exchange computer system, the order characteristics of the respective auction trade order are valid auction order characteristics; (2) in the case where the side of the transaction is buy, verifying, by the digital asset exchange computer system, the respective user has sufficient amounts of the second digital asset to cover the first auction trade order if filled in full; and (3) in the case where the side of the transaction is sell, verifying, by the digital asset exchange computer system, the respective user has sufficient amounts of the first digital asset to cover the first auction trade order if filled in full; (iii) upon successful verification of each respective auction trade order in step (a)(ii), the steps of: (1) updating, by the digital asset exchange computer system, each respective user account associated with each respective user to set aside sufficient reserves in the first digital asset or the second digital asset, as applicable, sufficient to cover each respective auction trade order which has been successfully verified if filled in full; and (2) storing in first electronic auction order book, by the digital asset exchange computer system on one or more computer readable mediums, each respective auction trade order which has been successfully verified; (b) for at least a first time period starting with a third time associated with the opening of an indicative auction publication, and continuing at least until the second time, obtaining, by the digital asset exchange computer system, blended digital asset pricing information comprising, for each of a plurality of fourth times between the third time and the second time, a respective blended digital asset price at each respective fourth time calculated by a volume weighted average of executed trading data for a second time period preceding the respective fourth time through the fourth time, of the first digital asset for the second digital asset from a plurality of specified digital asset exchanges for the respective second time period, wherein the executed trading data excludes (i) a first fixed percentage of the highest priced trades of the first digital asset pair on the plurality of specified digital asset exchanges during the second time period, and (ii) a second fixed percentage of the lowest priced trades of the first digital asset pairs on the plurality of specified digital asset exchanges during the second time period; (c) starting with the third time and continuing until the second time, electronically publishing, by the digital asset exchange computer system, at set time intervals between the third time and the second time, respective indicative results of the first auction order book if the auction were to close at the end of each respective time interval, wherein the respective indicative results include: (i) a respective highest bid price, which is calculated, by the digital asset exchange computer system, using the first auction order book, by determining the highest bid price in units of the second digital asset per unit of first digital asset included in the first auction order book at the end of each respective time interval; (ii) a respective lowest ask price, which is calculated, by the digital asset exchange computer system, using the first auction order book, by determining the lowest ask price in units of the second digital asset per unit of first digital asset included in the first auction order book at the end of each respective time interval; and (iii) a respective indicative price, which is calculated, as of a respective sixth time, by: (1) determining, by the digital asset exchange computer system, using the first auction order book, a respective indicative auction price in terms of the second digital asset for the first digital asset that will execute the greatest quantity of the first digital assets being transacted for the second digital assets; and (2) in the case where more than one respective indicative auction price is identified as having the same greatest quantity of the first digital assets being transaction for the second digital assets, selecting as the respective indicative auction price by applying the following order of priority: (A) the indicative auction price which is closest to the blended digital asset price for the respective sixth time; (B) the midpoint of the two adjacent indicative auction prices identified for the sixth time; and (i) a respective auction quantity, which is determined by the digital asset exchange computer system, as the quantity of units of the first digital asset which would match the respective indicative price as of the sixth time; (d) at the second time, closing the first auction order book, by the digital asset exchange computer system, and stop accepting new auction orders to be added to the first auction order book; (e) after step (d), calculating, by the digital asset exchange computer system, a collar price range by: (i) obtaining, by the digital asset exchange, the blended digital asset price for the second time; (ii) determining, by the digital asset exchange computer system, the minimum collar as the blended digital asset price for the second time less a third fixed percentage of the blended digital asset price for the second time; and (iii) determining, by the digital asset exchange computer system, the maximum collar as the blended digital asset price for the second time plus a fourth fixed percentage of the blended digital asset price for the second time; (f) after step (e), calculating, by the digital asset exchange computer system, final results of the first auction order book, wherein the final results include: (i) a final auction price at the second time, which is calculated by: (1) determining, by the digital asset exchange computer system, using the first auction order book at the second time, a final auction price in terms of the second digital asset for the first digital asset that will execute the greatest quantity of the first digital assets being transacted for the second digital assets; and (2) in the case where more than one respective final auction price is identified as having the same greatest quantity of the first digital assets being transaction for the second digital asset, selecting as the respective final auction price by applying the following order of priority: (A) the final auction price which is closest to the blended digital asset price for the second time; and (B) the midpoint of the two adjacent final auction prices for the second time; (ii) a final auction quantity, which is determined by the digital asset exchange computer system, as the quantity of units of the first digital asset which match the final auction price as of the second time; (g) verifying, by the digital asset exchange computer system, that the final auction price is greater than or equal to the minimum collar price and less than or equal to the maximum collar price; (h) in the case where the final auction price is verified to be greater than or equal to the minimum collar price and less than or equal to the maximum collar price, electronically publishing the final auction price and the final auction quantity as the results of the auction along with the second time; and (i) in the case where the final auction price is not verified to be greater than or equal to the minimum collar price and less than or equal to the maximum collar price, electronically publishing the auction failed along with the second time.

In embodiments, the final auction run at a final auction run time, e.g., 4:00 p.m. Eastern Standard Time in the above examples. In embodiments, at the final auction run time, no more orders on the continuous or auction order books are accepted. In embodiments, the midpoint of the best bid and best ask from the auction price will be taken as the auction collar price. In embodiments, an index value may be taken as the auction collar price.

The final auction price for every auction is established as the price that executes the greatest aggregate quantity and minimizes the imbalance between buy and sell orders across both the auction and continuous order books. The imbalance is defined as the absolute value of the difference between total buy orders and total sell orders at a given price across both the auction and continuous order books. Other pairings and timings may be used in accordance with the embodiments of the present invention.

Within this auction design, the market is open to accepting orders until the time the auction algorithm runs.

In embodiments, the digital asset exchange computer system 6102 may have one or more corresponding exchange key sets. Each of the one or more exchange key sets, in embodiments, may include an exchange public key and an exchange private key. In embodiments, each exchange private key may be mathematically related to a respective exchange public key. Each exchange public key, in embodiments, may be associated with an exchange public address. Each exchange public address be an address on the blockchain 6108 associated with the digital asset exchange computer system 6102. As used herein, the one or more exchange key sets, corresponding exchange public keys, corresponding exchange private keys, and corresponding exchange public address may be similar to the key sets, public keys, private keys, and public addresses described above, the descriptions of which applying herein.

In embodiments, the blockchain 6108 may maintain a digital asset on a distributed public transaction ledger. The digital asset, in embodiments, may be a digital math-based asset, such as BITCOIN, NAMECOINS, LITECOINS, PPCOINS, TONAL BITCOINS, BITCOIN CASH, ZCASH, IXCOINS, DEVCOINS, FREICOINS, I0COINS, TERRACOINS, LIQUIDCOINS, BBQCOINS, BITBARS, PHENIXCOINS, RIPPLE, DOGECOINS, BARNBRIDGE, POLYGON, SOMNIUM SPACE, OCEAN PROTOCOL, SUSHISWAP, INJECTIVE, LIVEPEER, MASTERCOINS, BLACKCOINS, ETHER, NXT, BITSHARES-PTS, QUARK, PRIMECOIN, FEATHERCOIN, PEERCOIN, FACEBOOK GLOBAL COIN, STELLAR, TOP 100 TOKENS, TETHER; MAKER; CRYPTO.COM CHAIN; BASIC ATTENTION TOKEN, USD COIN; CHAINLINK; BITTORRENT; OMISEGO; HOLO; TRUEUSD; PUNDI X; ZILLIQA; ATOM, AUGUR; 0X; AURORA; PAXOS STANDARD TOKEN; HUOBI TOKEN; IOST; DENT; QUBITICA, ENJIN COIN; MAXIMINE COIN, THORECOIN; MAIDSAFECOIN; KUCOIN SHARES; CRYPTO.COM; SOLVE; STATUS; MIXIN; WALTONCHAIN; GOLEM; INSIGHT CHAIN; DAI; VESTCHAIN; AELF; WAX; DIGIXDAO; LOOM NETWORK; NASH EXCHANGE; LATOKEN; HEDGETRADE; LOOPRING; REVAIN; DECENTRALAND; ORBS, NEXT, SANTIMENT NETWORK TOKEN; POPULOUS; NEXO; CELER NETWORK; POWER LEDGER; ODEM; KYBER NETWORK; QASH; BANCOR; CLIPPER COIN; MATIC NETWORK; POLYMATH; FUNFAIR; BREAD; IOTEX; ECOREAL ESTATE; REPO; UTRUST; ARCBLOCK; BUGGYRA COIN ZERO; LAMBDA, IEXEC RLC; STASIS EURS; ENIGMA; QUARKCHAIN; STORJ; UGAS; RIF TOKEN; JAPAN CONTENT TOKEN; FANTOM; EDUCARE; FUSION; GAS; MAINFRAME; BIBOX TOKEN; CRYPTO20; EGRETIA; REN; SYNTHETIX NETWORK TOKEN, VERITASEUM; CORTEX, CINDICATOR; CIVIC; RCHAIN; TENX; KIN; DAPS TOKEN; SINGULARITYNET; QUANT; GNOSIS; INO COIN; ICONOMI; MEDIBLOC [ERC20]; 0X; AION; ALGORAND; AMP; ARCA; ARWEAVE; AUDIUS; AVALANCHE; BCB; BCC; BITCOIN SV; BLOCKSTACKS; CBAT; CDAI; CELA; CELO; CETH; CHIA; CODA; COSMOS; CWBTC; CZRK; DECRED; DFINITY; EOS; ETH 2.0; FILECOIN; HEDGETRADE; ION; KADENA; KYBER NETWORK; MOBILECION, NEAR; NERVOS; OASIS, OMISEGO; PAXG; POLKADOT, SKALE; DIEM; SOLANA; STELLAR, TEZOS; THETA; XRP; DIEM and/or DEW, to name a few. In embodiments, the underlying digital asset may be a digital asset that is supported by its own digital asset network (like ETHER supported by the ETHEREUM Network, NEO supported by the NEO Network, to name a few). A digital asset token, in embodiments, may be a stable value token (such as GEMINI DOLLAR, PAXG, EFIL, EDOT, EXTZ, EATOM, to name a few), digital finance tokens that may be associated with decentralized lending (such as AMP, COMPOUND, PROTOCOL, KYBER, UMA, UNISWAP, YEARN, AAVE, to name a few), tokens, non-fungible token (such as CRYPTOKITTIES, Sorar, Decentraland, Goods Unchained, My Crypto Heroes, to name a few), and/or gaming tokens (such as SANDBOX), to name a few. In embodiments, tokens may be based on standards such as ERC-720, ERC-721, ERC-1155, to name a few.

A non-fungible token is a token which can represent assets like art, collectibles, games, real estate, to name a few, and are considered unique, e.g., no two non-fungible tokens are identical. Non-fungible tokens can also be used in games, such as Sorare—With 100 soccer clubs officially licensed,

- Sorare lets you purchase NFTs that represent professional soccer players that can be used to play fantasy games against other collectors.
- Decentraland—Decentraland is a virtual reality universe similar to The Sims or Second Life. Inhabitants of Decentraland buy, sell, and exchange ERC-721 tokens called LAND and use an ERC-20 token called MANA to purchase other in-universe items. Inside Decentraland, there are art shows, games, and specialized events users can participate in.
- Gods Unchained—Gods Unchained is a turn-based collectible card game. NFT cards depict various characters, creatures, events, and powers, which can be used to play one-on-one against an opponent.
- My Crypto Heroes—A multiplayer role-playing game, My Crypto Heroes issues NFTs of characters and other in-game items. Players level up their characters through battles and quests.

In embodiments, as noted above, the underlying digital asset may be a digital asset that is supported by its own digital asset network (like ETHER supported by the ETHEREUM Network). The digital asset token, in embodiments, may be a stable value token (such as Gemini Dollar), security tokens, and/or non-fungible token (such as CRYPTOKITTIES), to name a few. Unlike other types of digital asset tokens, a CRYPTOKITTY is a non-fungible token. A non-fungible token may be stored on a peer-to-peer distributed network in the form of a blockchain network (or other distributed networks). Examples of non-fungible tokens include one or more of the following: CRYPTOKITTIES, CRYPTOFIGHTERS, DECENTRALAND, ETHERBOTS, ETHERMON, RARE PEPPES, SPELLS OF GENESIS, CRAFTY, SUPERARRE, TERRA0, and/or UNICO, to name a few. In embodiments, non-fungible tokens, (e.g., 5 CRYPTOKITTIES) may be transferable and accounted for as a digital asset token on an underlying blockchain network (e.g., ETHEREUM Network). In embodiments, a first non-fungible token (e.g., a First CRYPTOKITTY) may have attributes (e.g., characteristics of a non-fungible token) that are different from a second non-fungible token (e.g., a Second CRYPTOKITTY), even if both are the same type of non-fungible token (e.g., a CRYPTOKITTY). For example, the First CRYPTOKITTY may be a striped CRYPTOKITTY, while the Second CRYPTOKITTY may be a droopy-eyed CRYPTOKITTY. In embodiments, the attributes of each non-fungible tokens may be customizable.

In embodiments, the first user device 6104 may initiate the connection with the digital asset exchange computer system 6102 by transmitting a connection request to the digital asset exchange computer system 6102 via network 125. The connection request may include a request to set up a channel (e.g., via the API 6107) for the purposes of trading on the digital asset exchange 6110. Trading, in embodiments, may refer to a user transferring one or more digital assets and/or one or more fiat or types of fiat for one or more digital assets and/or one or more fiat or types of fiat. In embodiments, the first user device 6104 may be a plurality of electronic devices. In embodiments, the first user device 6104 may be a mobile electronic device operating a mobile application for the purposes of trading on the digital asset exchange 6102. The digital asset exchange computer system 6102, in the embodiments where the first user device 6104 is a plurality of electronic devices, may be able to communicate with the plurality of electronic devices via the API 6107. In embodiments, each of the plurality of electronic devices may communicate with the digital asset exchange computer system 6102, each using a channel dedicated to one device of the plurality of electronic devices. An API, as used herein, may refer to machine-readable software that enables two applications to communicate and/or transfer information.

In embodiments, first user device 6104, as used herein, may, in embodiments, correspond to one or more suitable types of electronic devices including, but not limited to, desktop computers, mobile computers (e.g., laptops, ultrabooks), servers, mobile phones, portable computing devices, such as smart phones, tablets and phablets, televisions, set top boxes, smart televisions, personal display devices, personal digital assistants ("PDAs"), gaming consoles and/or devices, virtual reality devices, smart furniture, smart household devices (e.g., refrigerators, microwaves, etc.), smart vehicles (e.g., cars, trucks, motorcycles, etc.), smart transportation devices (e.g., boats, ships, trains, airplanes, etc.), and/or wearable devices (e.g., watches, pins/broaches, headphones, etc.), to name a few. In some embodiments, first user device 6104 may be relatively simple or basic in structure such that no, or a minimal number of, mechanical input option(s) (e.g., keyboard, mouse, track pad) or touch input(s) (e.g., touch screen, buttons) are included. For example, first user device 6104 may be able to receive and output audio, and may include power, processing capabilities, storage/memory capabilities, and communication capabilities. However, in other embodiments, first user device 6104 may include one or more components for receiving mechanical inputs or touch inputs, such as a touch screen and/or one or more buttons.

First user device 6104 may, in embodiments, be a voice activated electronic device. A voice activated electronic device, as described herein, may correspond to any device capable of being activated in response to detection of a specific word (e.g., a word, a phoneme, a phrase or grouping of words, or any other type of sound, or any series of temporally related sounds). For example, a voice activated electronic device may be one or more of the following: Amazon Echo®; Amazon Echo Show®; Amazon Echo Dot®; Smart Television (e.g., Samsung® Smart TVs); Google Home®; Voice Controlled Thermostats (e.g., Nest®; Honeywell® Wi-Fi Smart Thermostat with Voice Control), smart vehicles, smart transportation devices, wearable devices (e.g., Fitbit®), and/or smart accessories, to name a few.

In embodiments, first user device 6104 may include one or more processor(s) 6104-A, memory 6104-B, and communication portal 6104-C. One or more processor(s) 6104-A, may include any suitable processing circuitry capable of controlling operations and functionality of first user device 6104, as well as facilitating communications between various components within first user device 6104. In some embodiments, processor(s) 6104-A may include a central processing unit ("CPU"), a graphic processing unit ("GPU"), one or more microprocessors, a digital signal processor, or any other type of processor, or any combination thereof. In some embodiments, the functionality of processor(s) 6104-A may be performed by one or more hardware logic components including, but not limited to, field-programmable gate arrays ("FPGA"), application specific integrated circuits ("ASICs"), application-specific standard products ("ASSPs"), system-on-chip systems ("SOCs"), and/or complex programmable logic devices ("CPLDs"). Furthermore, each of processor(s) 6104-A may include its own local memory, which may store program systems, program data, and/or one or more operating systems. However, processor(s) 6104-A may run an operating system ("OS") for first user device 6104, and/or one or more firmware applications, media applications, and/or applications resident thereon. In some embodiments, processor(s) 6104-A may run a local client script for reading and rendering content received from one or more websites. For example, processor(s) 6104-A may run a local JavaScript client for rendering HTML or XHTML content received from a particular URL accessed by first user device 6104.

In embodiments, as mentioned above, first user device 6104 may also include memory 6104-B. Memory 6104-B may include one or more types of storage mediums such as any volatile or non-volatile memory, or any removable or non-removable memory implemented in any suitable manner to store data for first user device 6104. For example, information may be stored using computer-readable instructions, data structures, and/or program systems. Various types of storage/memory may include, but are not limited to, hard drives, solid state drives, flash memory, permanent memory (e.g., ROM), electronically erasable programmable read-only memory ("EEPROM"), CD ROM, digital versatile disk ("DVD") or other optical storage medium, magnetic cassettes, magnetic tape, magnetic disk storage or other magnetic storage devices, RAID storage systems, or any other storage type, or any combination thereof. Furthermore, memory 6104-B may be implemented as computer-readable storage media ("CRSM"), which may be any available physical media accessible by processor(s) 6104-A to execute one or more instructions stored within memory 6104-B. In some embodiments, one or more applications (e.g., mobile application software, gaming, music, video, calendars, lists, banking, social media etc.) may be run by processor(s) 6104-A, and may be stored in memory 6104-B.

In embodiments, as mentioned above, first user device 6104 may also include communications portal 6104-C. Communications portal 6104-C may include any circuitry allowing or enabling one or more components of the first user device 6104 to communicate with one another, with the digital asset exchange computer system 6102 (e.g., via the API 6107), and/or with one or more additional devices, servers, and/or systems. As an illustrative example, data retrieved from memory 6104-B may be transmitted via the API 6107, to the digital asset exchange computer system 6102 using any number of communications protocols. For example, the API 6107 may be accessed using Transfer Control Protocol and Internet Protocol ("TCP/IP") (e.g., any of the protocols used in each of the TCP/IP layers), Hypertext Transfer Protocol ("HTTP"), WebRTC, SIP, and wireless application protocol ("WAP"), are some of the various types of protocols that may be used to facilitate communications between first user device 6104 and the digital asset exchange computer system 6102. In some embodiments, first user device 6104 and digital asset exchange computer system 6102 may communicate with one another via a web browser using HTTP. Various additional communication protocols may be used to facilitate communications between first user device 6104 and/or digital asset exchange computer system 6102, include the following non-exhaustive list, Wi-Fi (e.g., 802.11 protocol), Bluetooth, radio frequency systems (e.g., 900 MHz, 1.4 GHz, and 5.6 GHz communication systems), cellular networks (e.g., GSM, AMPS, GPRS, CDMA, EV-DO, EDGE, 3GSM, DECT, IS 136/TDMA, iDen, LTE or any other suitable cellular network protocol), infrared, BitTorrent, FTP, RTP, RTSP, SSH, and/or VOIP.

Communications portal 6104-C may use any communications protocol, such as any of the previously mentioned exemplary communications protocols. In some embodiments, first user device 6104 may include one or more antennas to facilitate wireless communications with a network using various wireless technologies (e.g., Wi-Fi, Bluetooth, radiofrequency, etc.). In yet another embodiment, first user device 6104 may include one or more universal serial bus ("USB") ports, one or more Ethernet or broadband ports, and/or any other type of hardwire access port so that communications portal 6104-C allows first user device 6104 to communicate with one or more communications networks.

In embodiments, the first user device 6104 may include one or more display screens or other type of display device. The one or more display screens may correspond to a display device and/or touch screen, which may be any size and/or shape and may be located at any portion of the first user device 6104. Moreover, the display screen, in embodiments, may be operationally connected to the first user device 6104 (e.g., connected via one or more cables and/or wires, wireless connection, etc., to name a few). Various types of display devices may include, but are not limited to, liquid crystal displays ("LCD"), LED, OLED, QLED, monochrome displays, color graphics adapter ("CGA") displays, enhanced graphics adapter ("EGA") displays, video graphics array ("VGA") display, or any other type of display, or any variation or combination thereof. Still further, a touch screen may, in some embodiments, correspond to a display device including capacitive sensing panels capable of recognizing touch inputs thereon. For instance, the display screen may correspond to a projected capacitive touch ("PCT"), screen include one or more row traces and/or driving line traces, as well as one or more column traces and/or sensing lines. In some embodiments, the display screen may be an optional component for the first user device 6104. For instance, the first user device 6104 may not include the display screen. Such devices, sometimes referred to as "headless" devices, may output audio, or may be in communication with a display device for outputting viewable content.

In embodiments, the display screen, may include an insulator portion, such as glass, coated with a transparent conductor, such as indium tin oxide ("InSnO" or "ITO"). In general, one side of the touch screen display may be coated with a conductive material. A voltage may be applied to the conductive material portion generating a uniform electric field. When a conductive object, such as a human finger, stylus, or any other conductive medium, contacts the non-conductive side, typically an outer surface of the display screen, a capacitance between the object and the conductive material may be formed. The one or more processor(s) 6104-A may be capable of determining a location of the touch screen associated with where the capacitance change is detected and may register a touch input as occurring at that location.

In some embodiments, the display screen may include multiple layers, such as a top coating layer, a driving line layer, a sensing layer, and a glass substrate layer. The glass substrate layer may correspond to an insulator portion, while the top coating layer may be coated with one or more conductive materials. The driving line layer may include a number of driving lines, and the sensing layer may include a number of sensing lines, which are described in greater detail below. One or more additional layers, or spaces between layers, may be included. Furthermore, any suitable number of driving lines and sensing lines for driving the line layer and the sensing layer, respectively, may be used.

In some embodiments, the driving lines and the sensing lines of the driving line layer and the sensing line layer, respectively, may form a number of intersection points, where each intersection functions as its own capacitor. Each sensing line may be coupled to a source, such that a charge is provided to each sensing line, and changes in capacitance of a particular driving line and sensing line are detectable thereby. In response to a conductive object being brought proximate, or substantially touching an outer surface of the top coating layer, a mutual capacitance of a particular capacitor (e.g., an intersection point) may reduce in magnitude. In other words, a voltage drop may be detected at a location on the display screen of the first user device 6104 corresponding to where a conductive object contacted the display screen.

A change in capacitance may be measured to determine a location on the touch screen where the object has contacted the surface. For example, if an individual touches a point on the display screen of the first user device 6104, then a corresponding driving line and sensing line that intersect at that point may be identified. A location of the point may have one or more pixels associated with that location, and therefore one or more actions may be registered for an item or items that are displayed at that location. The one or more processor(s) 6104-A of the first user device 6104 may be configured to determine which pixels are associated with a particular location point, and which item or items are also displayed at that pixel location. Furthermore, the first user device 6104 may be configured to cause one or more additional actions to occur to the item or items being displayed on the display screen of the first user device 6104 based on a temporal duration the touch input, and or if one or more additional touch inputs are detected. For example, an object (e.g., a user's hand, a stylus, etc., to name a few) that is contacted on the display screen at a first location may be determined, at a later point in time, to contact the display screen at a second location. In the illustrative example, the object may have initially contacted the display screen at the first location and moved along a particular driving line to the second location. In this scenario, a same driving line may have detected a change in capacitance between the two locations, corresponding to two separate sensing lines.

The number of driving lines and sensing lines, and therefore the number of intersection points, may directly correlate to a "resolution" of a touch screen. For instance, the greater the number of intersection points (e.g., a greater number of driving lines and sensing lines), the greater precision of the touch input. For instance, a touch screen having 100 driving lines and 100 sensing lines may have 100 intersection points, and therefore 100 individual capacitors, while a touch screen having 10 driving lines and 10 sensing lines may only have 10 intersection points, and therefore 10 individual capacitors. Therefore, a resolution of the touch screen having 100 intersection points may be greater than a resolution of the touch screen having 10 intersection points. In other words, the touch screen having 100 intersection points may be able to resolve a location of an object touching the touch screen with greater precision than the touch screen having 10 intersection points. However, because the driving lines and sensing lines require a voltage to be applied to them, this may also mean that there is a larger amount of power drawn by the first user device 6104, and therefore the fewer driving lines and/or sensing lines used, the smaller the amount of power that is needed to operate the touch display screen.

In some embodiments, the display screen of the first user device 6104 may correspond to a high-definition ("HD") display. For example, the display screen may display images and/or videos of 720p, 1080p, 1080i, or any other image resolution. In these exemplary scenarios, the display screen may include a pixel array configured to display images of one or more resolutions. For instance, a 720p display may present a 1024 by 768, 1280 by 720, or 1366 by 768 image having 786,432; 921,600; or 1,049,088 pixels, respectively. Furthermore, a 1080p or 1080i display may present a 1920 pixel by 1080 pixel image having 2,073,600 pixels. However, the aforementioned display ratios and pixel numbers are merely exemplary, and any suitable display resolution or pixel number may be employed for the display screen, such as non-HD displays, 4K displays, and/or ultra displays.

The digital asset exchange computer system 6102, in embodiments, may include one or more processor(s) 6102-A, network connection interface 6102-B, and memory 6102-C. One or more processor(s) 6102-A, as used herein, may be similar to the one or more processor(s) 6104-A described above, the description of which applying herein. The network connection interface 6102-B may be similar to the communication portal 6104-C described above, the description of which applying herein. Memory 6102-C may be similar to memory 6104-B described above, the description of which applying herein. The digital asset exchange computer system 6102 may, in embodiments, be a plurality of computers and/or computer systems. In embodiments, the exchange computer system 6102 may further include one or more display screens, which may be similar to the display screen described above, the description of which applying herein.

The digital asset exchange 6110, in embodiments, may include one or more processor(s) 6110-A, network connection interface 6110-B, and memory 6110-C. One or more processor(s) 6110-A, as used herein, may be similar to the one or more processor(s) 6104-A described above, the description of which applying herein. The network connection interface 6110-B may be similar to the communication portal 6104-C described above, the description of which applying herein. Memory 6110-C may be similar to memory 6104-B described above, the description of which applying herein. The digital asset exchange 6110 may, in embodiments, be a plurality of computers and/or computer systems.

Figure 65:
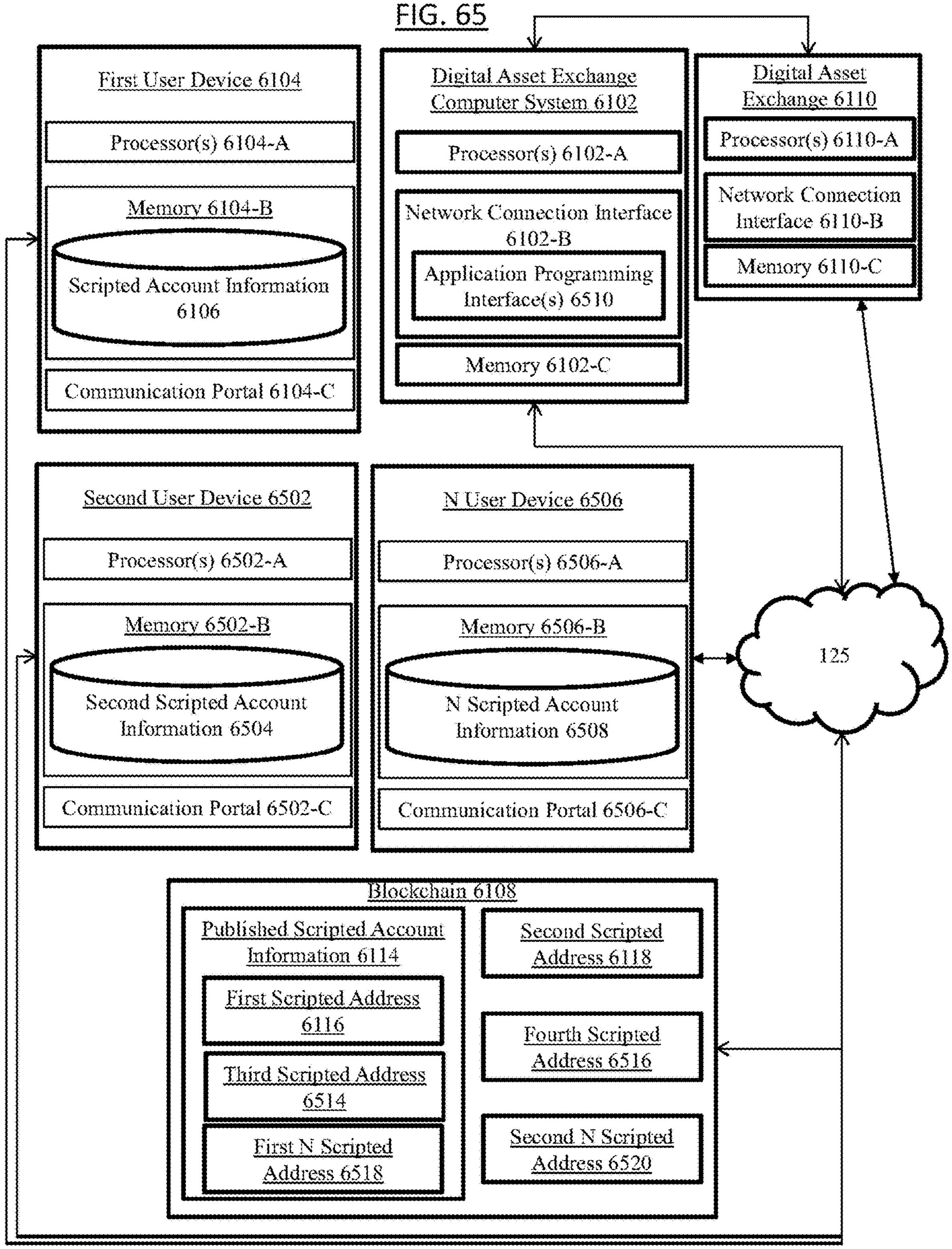
FIG. 65 is an exemplary block diagram illustrating a digital asset exchange computer system communicating with a plurality of user devices via a plurality of channels in accordance with exemplary embodiments of the present invention.

FIG. 65 is an exemplary block diagram illustrating a digital asset exchange computer system 6102 communicating with a plurality of user devices via a plurality of channels in accordance with exemplary embodiments of the present invention. In embodiments, the digital asset exchange computer system 6102 may receive requests to trade on the digital asset exchange 6110 via a channel from a plurality of user devices, which may include first user device 6104, second user device 6502 . . . N user device 6506. Each user device of the plurality of user devices may correspond to a different customer (e.g., first user device 6104 is associated with the first customer 6202, second user device 6502 is associated with a second customer . . . N user device 6506 is associated with a N customer, to name a few). In embodiments, as shown in FIG. 65, each user device may have its own channel with the digital asset exchange computer system 6102. In embodiments, each channel may have a different application programming interface of API 6510. In embodiments each channel may communicate via API 6107. In embodiments, the API 6107, the second API 6510, and the N API 6512 are the same channel. In embodiments, the digital asset exchange computer system 6102 may perform the processes described in FIGS. 62A-62E and FIGS. 63A-63E with each user device of the plurality of user devices, the descriptions of which applying herein. In embodiments, the digital asset computer system 6102 may generate different mathematical puzzles with corresponding solutions for each user device. For example, the digital asset exchange computer system 6102 may generate a second mathematical puzzle and a second corresponding solution for the second user device 6502.

In embodiments, the second user device 6502 may include one or more processor(s) 6502-A, memory 6502-B, and communications portal 6502-C. The second user device 6502 and the components thereof may be similar to the first user device 6104, the description of which applying herein. In embodiments, the second user device 6502 may utilize scripted accounts and addresses to trade on the digital asset exchange 6110. The second user device may store, similar to the first user device 6104, second scripted account information 6504 which may be associated with the third scripted address 6514 and the fourth scripted address 6516. The second scripted account information 6504, third scripted address 6514, and fourth scripted address 6516 may be similar to the scripted account information 6106, the first scripted address 6116 and the second scripted address 6118 respectively, the descriptions of which applying herein.

In embodiments, the N user device 6505 may include one or more processor(s) 6506-A, memory 6506-B, and communications portal 6506-C. The N user device 6506 and the components thereof may be similar to the first user device 6104, the description of which applying herein. In embodiments, the N user device 6506 may utilize scripted accounts and addresses to trade on the digital asset exchange 6110. The N user device may store, similar to the first user device 6104, N scripted account information 6508 which may be associated with the first N scripted address 6518 and the second N scripted address 6520. The N scripted account information 6508, first N scripted address 6518, and the second N scripted address 6520 may be similar to the scripted account information 6106, the first scripted address 6116 and the second scripted address 6118 respectively, the descriptions of which applying herein.

Auction Event

In embodiments, at a set time period before the auction begins, e.g., 10 minutes, an indicative auction event window may be opened. An indicative auction event is a simulation of what would happen if the auction ran at that point in time. In embodiments, an indicative auction uses the same pricing algorithm as the final auction price determination. In embodiments, although the auction order book is blind, indicative auction events show when there is a buy/sell interest imbalance so participants may adjust their orders.

During an indicative auction window, indicative results may be published at set time intervals, such as once a minute, twice a minute, four times a minute, to name a few, and will continue to be published until the indicative auction window closes. In embodiments, the indicative auction window will not close until the auction is run.

In the example above, for an auction beginning at 4:00 p.m. Eastern Standard Time, an indicative auction window may be opened 10 minutes prior at 3:50 p.m. Eastern Standard Time. Indicate results are published once a minute starting at the opening of the indicative auction window at 3:50 p.m. Eastern Standard Time, 10 minutes before the 4:00 p.m. auction. Starting at one minute before the auction window, 3:59 p.m. Eastern Standard Time, the indicative price may be published every 15 seconds. An indicative auction window will close when the auction window opens at 4:00 p.m., with the last indicative price published at 3:59:45 p.m. Eastern Time. Of course, other time periods can be used to set the opening and closing of the indicative auction windows and one or more intervals of publication can be used in that windows.

Figure 55:
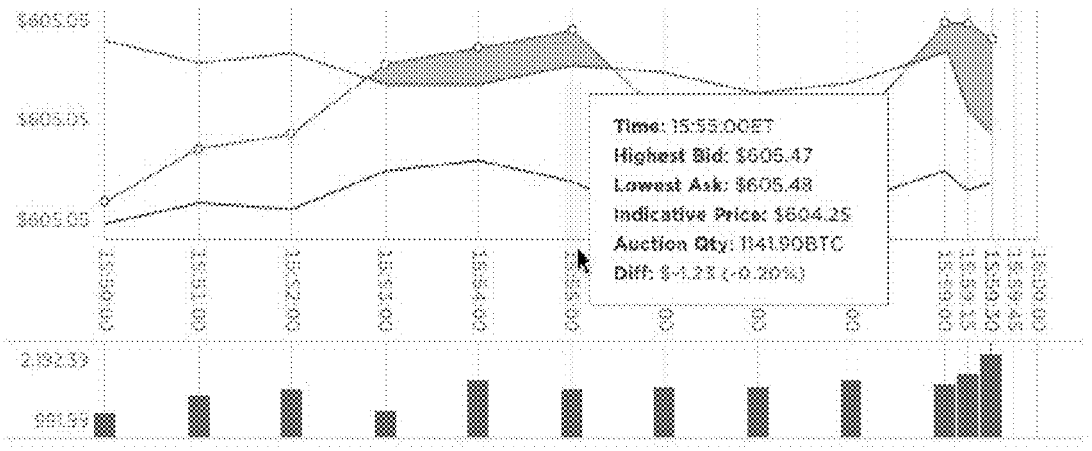
FIG. 55 illustrates an example of indicative auction results as may be published during an indicative auction window.

FIG. 55 illustrates an example of indicative auction results as may be published during an indicative auction window.

Detection of Security Incident and Prevention of Fraud

In embodiments, a data incident or data breach may occur, causing a risk to digital assets owned by one or more customers of the digital asset exchange 6110. Referring to FIG. 63C, an incident or data breach response may be detected between steps S6324 and S6326. The digital asset exchange computer system 6102 may determine that a security incident has occurred, at any point of the process described in connection with FIGS. 63A-D. A security incident, in embodiments, may refer to an event that may indicate that the digital asset exchange's 6110 systems or data have been compromised or that measures put in place to protect the systems or data have failed. A data breach, in embodiments, may refer to a security incident in which sensitive, protected, or confidential data is copied, transmitted, viewed, stolen or used by an unauthorized source or individual. Referring to FIG. 63F, at step S6350, the digital asset exchange computer system 6102 may determine a security incident and/or data breach has occurred.

In the context of the process described in connection with FIGS. 63A-D, the digital asset computer exchange system 6102 may next determine whether the first transaction request was caused by the security incident. In embodiments, the first transaction request may have been caused by a security incident. Referring to FIG. 63F, at step S6352-1, the digital asset computer exchange system 6102 may determine that the first transaction request was the cause of the detected security incident. For example, the second transaction request may have been the result of an unauthorized individual accessing the first customer's 6202 account with the digital asset exchange 6110. That unauthorized user, in embodiments, may have sent the first transaction request.

In response to determining the second transaction request was caused by the security incident, at step S6352-1, the digital asset exchange computer system 6102 at step S6352-1, may transmit the first solution to the first mathematical puzzle. The first solution, in embodiments, may be obtained by the digital asset exchange computer system 6102 via memory 6102-C and transmitted to the first user device 6104 via the API 6107 and/or network 125. The transmission of solution to the puzzle may be based on the type of security incident the digital asset exchange 6110 is experiencing. For example, if data transmitted over the API 6107 and the network 125 is compromised, the digital asset exchange computer system 6102 may transmit the solution via network 125.

Once the first solution is received by the first user device 6104, the first user device 6104 may transmit a transaction request including the first solution to withdrawal the first amount of digital asset to the first scripted address 6116 and/or the second scripted address 6118. The transaction request, in embodiments, may be digitally signed by the customer private key. When the transaction request is received, the first scripted address 6116 and/or the second scripted address 6118 may transfer the first amount of digital assets deposited by the first customer 6202 to the first user public address. In embodiments, the first scripted address 6116 and/or the second scripted address 6118 may transfer the first amount of digital assets to the first user public address.

To ensure that the customer did not lose any digital assets as a result of the security incident, the digital asset exchange computer system 6102 may, at step S6356-1, may confirm that the first amount of digital assets has been received by the first user public address. To confirm receipt, the digital asset exchange computer system 6102 may send a call to the first user public address to confirm receipt of the digital assets. In return, the first user public address may send a return either confirming receipt or not confirming receipt. If receipt of the digital assets is not confirmed, the digital asset exchange computer system 6102 may generate and send a data breach notification to the first user device 6104, indicating what happened and how the first customer 6202 can proceed.

In embodiments, the first transaction request may not have been caused by the security incident. At a step S6352-2, the digital asset exchange computer system 6102 determines that the security incident did not cause the first transaction request. In these embodiments, the digital asset exchange computer system 6102 may take steps to end the trading of the first customer 6202 on the digital asset exchange 6110 via the API 6107.

At step S6354-2, the digital asset exchange computer system 6102 may digitally sign the first transaction request. After the digital asset exchange computer system 6102 digitally signs the first transaction request, the first transaction request would then have the transfer requests, the customer private key, and a private key associated with the digital asset exchange 6110 (e.g., the first exchange private key, the second exchange private key, and/or the third exchange private key, to name a few). As described above, the first authorization instructions of the first scripting limitations 6124 may authorize transactions that include both the customer private key and a private key associated with the digital asset exchange 6110.

In embodiments, the digital asset exchange computer system 6102 may generate a second transaction request reflecting the first order. In embodiments, the second transaction request may be to transfer the second amount of digital assets to a public address associated with the digital asset exchange 6110. Additionally, in embodiments, the second transaction request may have a second transfer to transfer a third amount (e.g., the first amount less the second amount) to the first user public address. Once the second transaction is generated, the digital asset exchange computer system 6102 may transmit the second transaction request to the first user device 6104. After receiving the second transaction request, the first user device 6104 may digitally sign the second transaction request and send the digitally signed transaction request back to the digital asset exchange computer system 6102. Once received, the digital asset exchange computer system 6102 may verify and sign the second transaction request.

Next, the digital asset exchange computer system 6102 at step S6356-2 may transmit the first transaction request (and/or the aforementioned second transaction request) to the first scripted address 6116 via network 125. The transmission of the first transaction request, in embodiments, may cause the first transaction request to be executed by the first scripted address. In embodiments, when publishing the first transaction request and/or the second transaction request on the blockchain 6108, in embodiments, the digital asset exchange computer system 6102 may flag the request as published as a result of a security incident detected that did not affect the transaction/order. In embodiments, publishing of the first and/or second transaction request on the blockchain 6108, in embodiments, may cause the remaining digital assets that are owned by the first user and located on the first scripted address 6116 and/or the second scripted address 6118 to be transferred to the first user public address.

As discussed above, to ensure that the customer did not lose any digital assets as a result of the security incident, the digital asset exchange computer system 6102 at step S6358-2 may confirm that a third amount of digital assets has been received by the first user public address. In embodiments, the third amount may refer to the first amount of digital assets less the second amount of digital assets. To confirm receipt, the digital asset exchange computer system 6102 may send a call to the first user public address to confirm receipt of the third amount of digital assets. In return, the first user public address may send a return either confirming receipt or not confirming receipt. If receipt of the digital assets is not confirmed, the digital asset exchange computer system 6102 may generate and send a data breach notification to the first user device 6104, indicating what happened and how the first customer 6202 can proceed.

The steps of the process described in connection with FIG. 63F may be rearranged or omitted.

Another security measure that may be implemented by the digital asset exchange computer system 6102 may be in the form of a whitelist. A whitelist, in embodiments, may be a list which may include a list of addresses that a user may authorize to withdraw digital asset tokens. For example, a whitelist associated with the first customer 6202 may include the first user public address associated with the first user public key 6120. As another example, a whitelist may contain a user's public address which may limit all withdrawals to the user's public address. Alternatively, in embodiments, a whitelist may be a list which may include a list of addresses that a user may not want digital asset tokens withdrawn to. For example, a whitelist may contain a user's old business partner's public address, limiting withdrawals to public addresses that are not the user's old business partner's public address. In embodiments, the digital asset exchange computer system 6102 may store a plurality of whitelists for a plurality of customers on memory 6102-C. Additionally, in embodiments, the digital asset exchange computer system 6102 may store a plurality of whitelists for a plurality of customers on a whitelist database on memory 6102-C.

Figure 66:
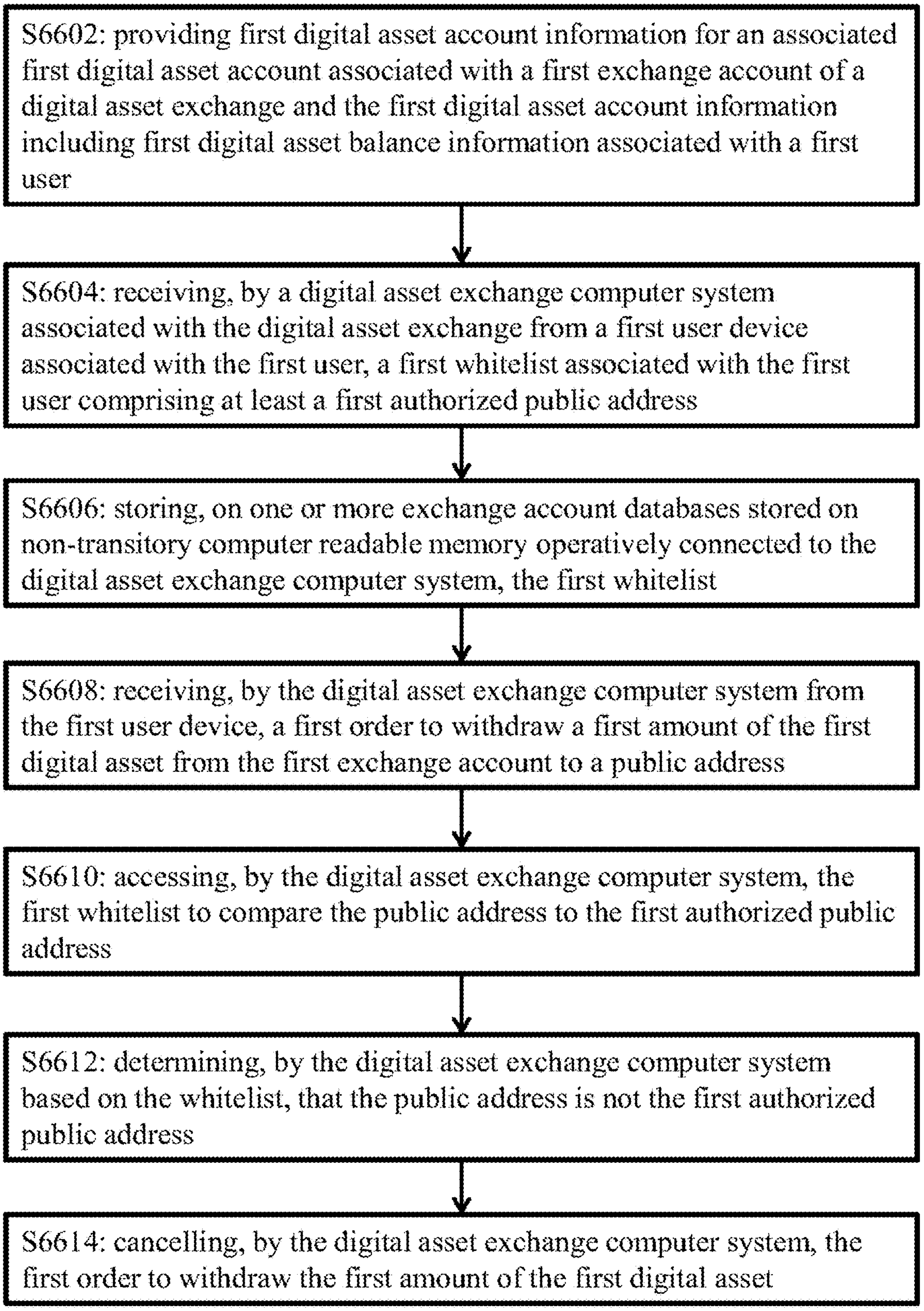
FIG. 66 is an exemplary flowchart of a process for protecting a user account from unauthorized transactions in accordance with embodiments of the present invention.

In embodiments, a whitelist may be used by the digital asset exchange computer system 6102 and first customer 6202 in accordance with the process of FIG. 66. FIG. 66 is an exemplary flowchart of a process for protecting a user account from unauthorized transactions. In embodiments, the process of FIG. 66 may begin at a step S6602. At step S6602, first digital asset account information for an associated first digital asset account associated with a first exchange account of a digital asset exchange may be provided. The first digital account information, in embodiments, may include first digital asset balance information associated with a first user (e.g., the first customer 6202). For example, the first digital asset account information may include information indicating the first customer has 100 BITCOINs.

The process of FIG. 66 may continue at a step S6604. At step S6604, the digital asset exchange computer system 6102 may receive a first whitelist from the first user device 6104. The first whitelist, which may be associated with the first customer 6202, may include a first authorized public address. In embodiments, the first white list may include a first blocked public address. In embodiments, the first whitelist may include one or more of: a plurality of blocked public addresses; and/or a plurality of authorized public addresses, to name a few.

The whitelist, as shown in step S6606, may be stored on one or more exchange account databases by the digital asset exchange computer system 6102. In embodiments, the one or more exchange account databases may be stored on non-transitory computer readable memory operatively connected to the digital asset exchange computer system (e.g., in memory 6102-C).

After storing the whitelist, the digital asset exchange computer system 6102 may receive a first order from the first user device 6104 via network 125, the API 6107. The first order, in embodiments, may be to withdraw a first amount of the first digital asset from a first exchange account to a public address. In embodiments, the first exchange account may be associated with the digital asset exchange computer system 6102 and the first customer 6202. The public address, in embodiments, may be a public address associated with a second customer. The public address, in embodiments, may be a public address associated with the first customer 6202. In embodiments, the first order may be related to a first transaction request to withdraw the first amount of the first digital asset. In embodiments, the first order and/or first transaction request may be digitally signed by the first user private key.

In embodiments, the digital asset exchange computer system 6102 may determine that the first customer 6202 has a whitelist associated with their account. In embodiments at step S6710, the digital asset exchange computer system 6102 may access and/or obtain the first whitelist. In embodiments, the first whitelist may be accessed and/or obtained for the purposes of comparing the public address to the first authorized public address.

The process of FIG. 66 may proceed at a step S6612. At step S6612, the digital asset exchange computer system 6102 may determine that the public address is not the first authorized public address. This determination, in embodiments, may be based on the first whitelist. In embodiments, the determination may be made by comparing the public address to the first authorized public address.

In response to determining that the withdraw request is to be sent to a public address on that is not included in the first whitelist, as illustrated in step S6614, the digital asset exchange computer system 6102 may cancel the first order to withdraw the first amount of the first digital asset. In embodiments, the cancelling of the first order may occur before the digital asset exchange computer system 6102 transmits the order and/or transaction request to the blockchain 6108 for the purposes of executing the withdrawal. In embodiments, once the order is cancelled, the digital asset exchange computer system may generate and send a notification to the first user device 6104. The notification may explain why the order was cancelled and alert the first customer 6202 to a possible security incident, the possible security incident being related to the requested withdrawal of digital assets to an unauthorized public address.

The steps of the process described in connection with FIG. 66 may be rearranged or omitted.

VPN on the Blockchain

Figure 77A:
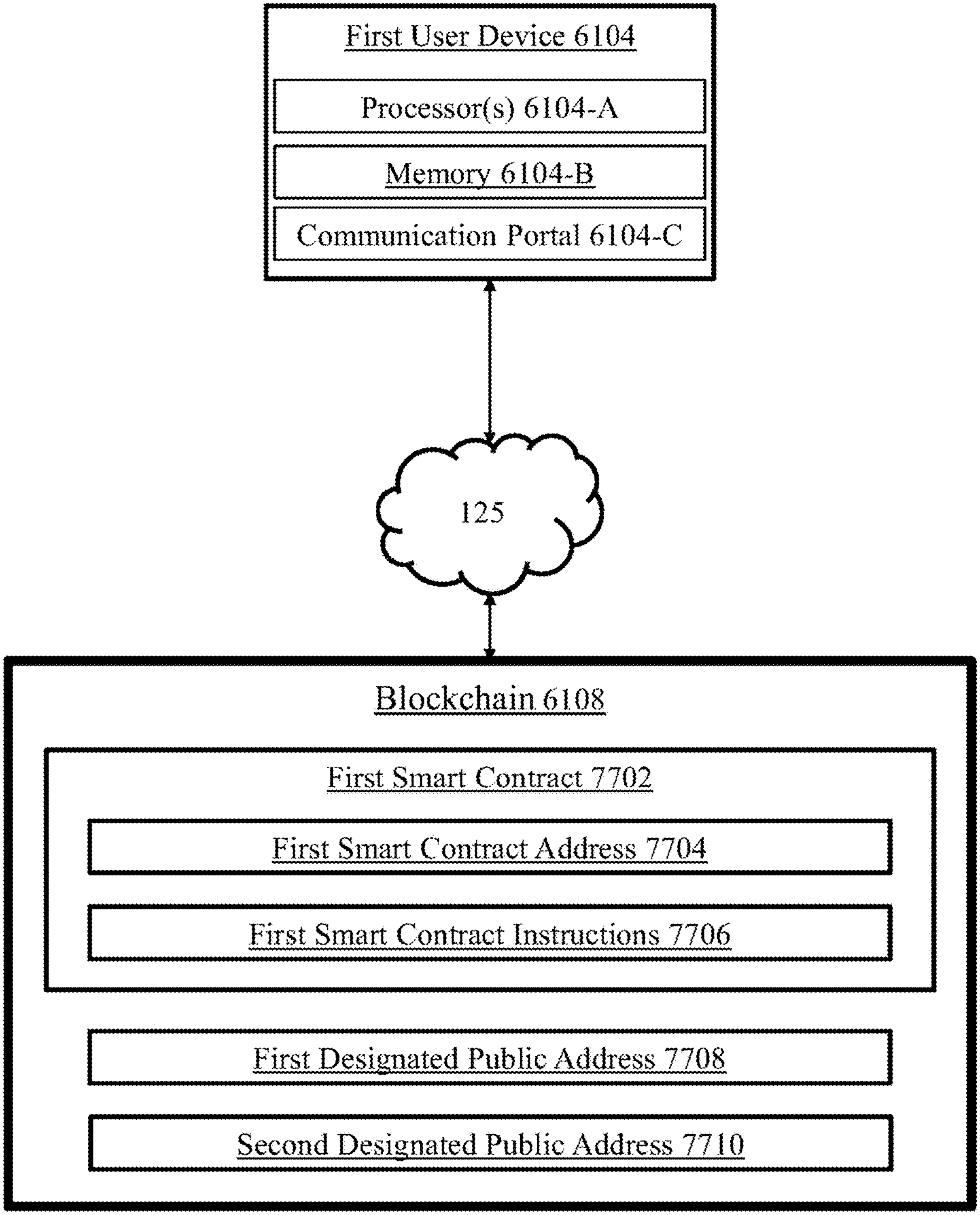
Figure 77B:
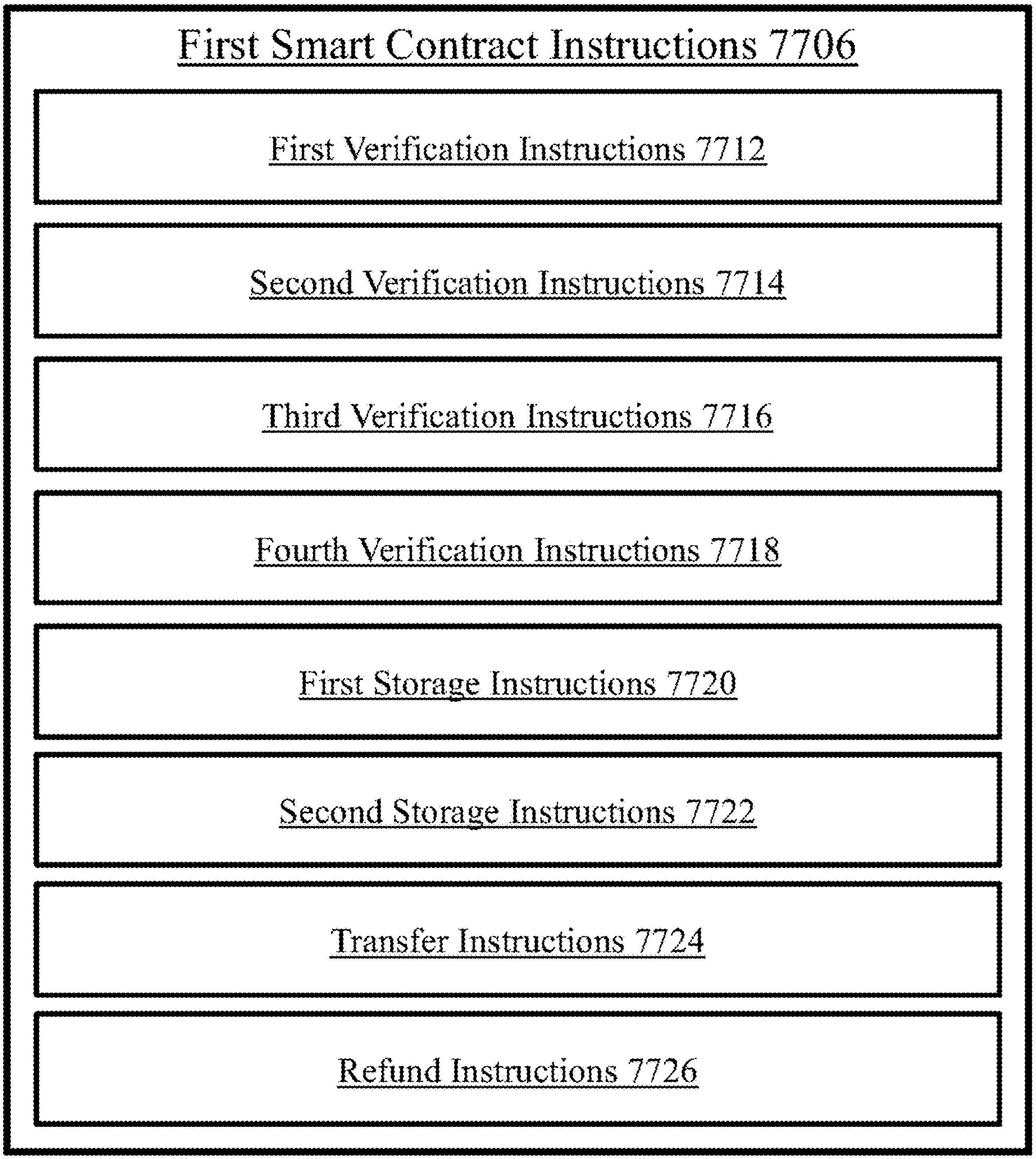
Figure 77C:
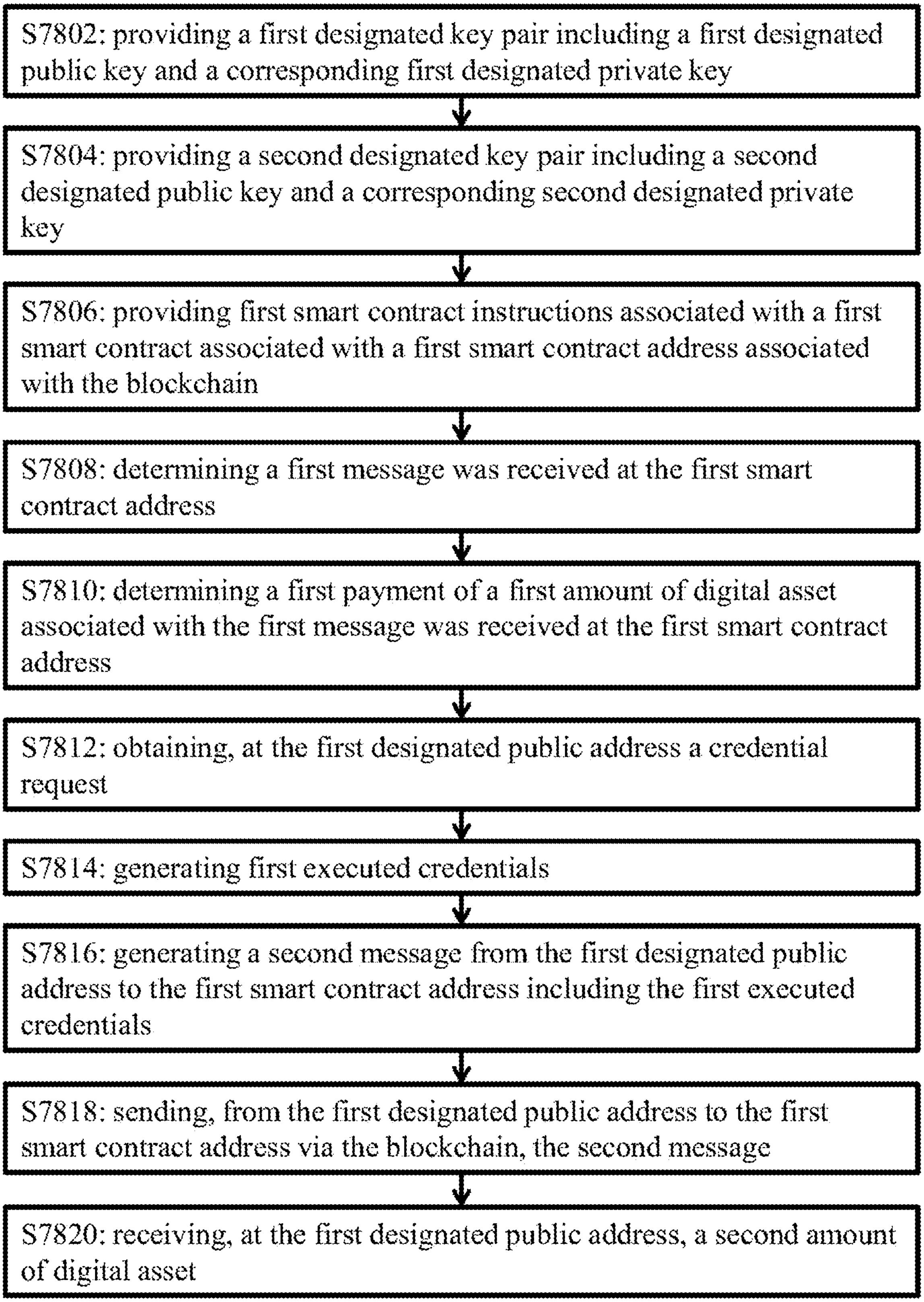

FIG. 77C illustrates a process for providing VPN, VPN services, and/or access to goods and/or services on a blockchain in accordance with exemplary embodiments of the present invention. In embodiments, the process of FIG. 77C may begin at step S7802. At step S7802, a first designated key pair including a first designated public key and a corresponding first designated private key may be provided. In embodiments, the first designated key pair is associated with an administrator computer system associated with an administrator of the first smart contract 7702. In embodiments, the first designated public key also corresponds to a first designated public address 7708 associated with the administrator computer system and an underlying digital asset. The underlying digital asset is maintained on a distributed public transaction ledger maintained in the form of a blockchain by a plurality of geographically distributed computer systems in a peer-to-peer network. The first designated private key is stored on a first computer system which is connected to a distributed public transaction ledger via the Internet. In embodiments the first designated private key is a Rivest-Shamir-Adleman (RSA) public key. In embodiments, the first designated key pair may be similar to the first designated key pair and/or the second designated key pair described above in connection with steps S3902 and S3904 of FIG. 39A, the descriptions of which applying herein. In embodiments, the administrator computer system may be similar to the first user device 6104 and/or the digital asset exchange computer system 6102, described above in connection with FIG. 61A the descriptions of which applying herein.

In embodiments, the process of FIG. 77C may continue with step S7804. At step S7804, in embodiments, a second designated key pair including a second designated public key and a corresponding second designated private key may be provided. In embodiments, the second designated key pair is associated with the administrator computer system associated with the administrator and the second designated public key also corresponds a second designated public address 7710 associated with the administrator computer system and the underlying digital asset. In embodiments, the second designated key pair is the first designated key pair. In embodiments the second designated key pair is not the first designated key pair. In embodiments the second designated private key is a Rivest-Shamir-Adleman (RSA) public key. In embodiments, the second designated key pair may be similar to the first designated key pair and/or the second designated key pair described above in connection with steps S3902 and S3904 of FIG. 39A, the descriptions of which applying herein.

In embodiments, the process of FIG. 77C may continue with step S7806. At step S7806, in embodiments, first smart contract instructions 7706 may be provided. The first smart contract instructions 7706, in embodiments, may be associated with a first smart contract 7702, which may be associated with a first smart contract address 7704. In embodiments, the first smart contract address 7704, may be associated with an underlying digital asset which is maintained on a distributed public transaction ledger maintained in the form of a blockchain 6108 by a plurality of geographically distributed computer systems. As shown in FIG. 77A, blockchain 6108 may include the first smart contract 7802, which may be associated with the first smart contract address 7804, first smart contract instructions 7806 and certificate authority information 7810.

Referring to FIG. 77B, the first smart contract instructions 7706 may include one or more of the following: first verification instructions 7712; second verification instructions 7714; third verification instructions 7716; fourth verification instructions 7718; first storage instructions 7720; second storage instructions; 7722; transfer instructions 7724; and/or refund instructions 7726, to name a few.

In embodiments, the first storage instructions 7720 may indicate conditions under which one or more received credential requests are stored (e.g., on the blockchain 6108). For example, the one or more conditions may include a first condition directing the first smart contract 7702 to store a respective credential request after a payment associated with the respective credential request is received. If, in embodiments the payment is not received, the first smart contract 7702 may not perform the VPN process and/or may generate and publish a notification on the blockchain 6108 indicating the deficiencies of the credential request.

In embodiments, the first verification instructions 7712 may indicate conditions under which the first smart contract 7702 verifies a payment associated with a received credential request. In embodiments, the first verification instructions 7712 may include one or more instructions to: verify that a payment was received, verify the type of digital asset received, verify the value of digital asset received, and/or verify the value of digital asset received is equal to the value of digital asset required for payment for the VPN services. The value required, in embodiments, may be a predetermined amount of digital asset. If, in embodiments the payment is not verified, the first smart contract 7702 may not perform the VPN process and/or may generate and publish a notification on the blockchain 6108 indicating the deficiencies of the credential request.

In embodiments, the second verification instructions 7714 may indicate conditions under which the first smart contract 7702 verifies one or more received credential requests. In embodiments, the second verification instructions 7714 may include one or more instructions to: verify whether one or more received credential requests are syntactically valid; verify a structure of received credential requests; verify one or more providers associated with the one or more received credential requests; and/or verify whether one or received credential requests are expired based on a current time and an expiration date associated with the one or more digital certificates (e.g., if the current time is the expiration date and/or after the expiration date, the received credential request is expired, if the current time is before the expiration date or the expiration date, the received credential request may not be expired), to name a few. In embodiments, the second verification instructions 7714 may be provided in accordance with EIP-198. If, in embodiments a credential request is not verified, the first smart contract 7702 may not perform the VPN process and/or may generate and publish a notification on the blockchain 6108 indicating the deficiencies of the credential request.

In embodiments, the second storage instructions 7722 may indicate conditions under which one or more executed credentials are stored (e.g., on the blockchain 6108). For example, the one or more conditions may include a first condition directing the first smart contract 7702 to store a respective executed credential after a payment associated with the respective executed credential is received with the executed credential.

In embodiments, the third verification instructions 7716 may indicate conditions under which the first smart contract 7702 verifies one or more received executed credentials. In embodiments, the third verification instructions 7716 may include one or more instructions to: verify whether one or more received executed credentials are syntactically valid; verify a structure of received executed credentials; verify one or more providers associated with the one or more received executed credentials; and/or verify whether one or received executed credentials are expired based on a current time and an expiration date associated with the one or more digital certificates (e.g., if the current time is the expiration date and/or after the expiration date, the received executed credential is expired, if the current time is before the expiration date or the expiration date, the received executed credential may not be expired), to name a few. In embodiments, the third verification instructions 7716 may be provided in accordance with EIP-198. If, in embodiments a received executed credential is not verified, the first smart contract 7702 may stop the VPN process and/or may generate and publish a notification on the blockchain 6108 indicating the deficiencies of the executed credential.

In embodiments, the transfer instructions 7724 may indicate conditions under which the first smart contract 7702 transfers an amount of digital asset from the first smart contract address (e.g., to the first designated public address 7708 and/or the second designated public address 7710, to name a few). The conditions under which the first smart contract 7702 transfers an amount of digital asset may include one or more of the following: (1) a predetermined amount of digital asset has been received by the first smart contract address 7704; a credential request associated with the predetermined amount of digital asset has been verified; executed credentials associated with the predetermined amount of digital asset have been verified; and/or executed credentials associated with the predetermined amount of digital asset have been stored as part of the blockchain 6108. In embodiments, the predetermined amount of digital asset is less than, greater than, and/or equal to the payment required for a credential request. In embodiments, the predetermined amount of digital asset is the payment required for a credential request plus the necessary fees for transferring the first amount of digital asset to the first designated public address 7708 and/or the second designated public address 7710.

In embodiments, the fourth verification instructions 7718 indicate conditions under which the first smart contract 7702 verifies one or more providers of the one or more executed credentials. The process of verifying a provider may be similar to the process and/or instructions for verifying one or more issuers of a digital certificate, described below in connection with FIGS. 78A-78C and 79, the description of which applying herein.

In embodiments, the refund instructions 7726 may indicate conditions under which a payment associated with a received credential request is transferred (e.g., refunded) from the first smart contract address 7704 to a public address associated with the received payment and/or credential request. In embodiments, conditions under which a payment associated with a received credential request is transferred (e.g., refunded) from the first smart contract address 7704 to a public address associated with the received payment and/or credential request may include one or more of the following. (1) a credential request and a payment associated with the credential request has been received by the first smart contract 7702; (2) an administrator of the first smart contract 7702 has not obtained the credential request; and/or (3) a predetermined amount of time (e.g., an hour, day, week, to name a few) has elapsed since the credential request and payment have been received by the first smart contract 7702, to name a few.

Referring back to FIG. 77C, the process of FIG. 77C may continue with step S7808. At step S7808, in embodiments, the administrator computer system may determine a first message was received at the first smart contract address 7704. In embodiments, the first message may include one or more of the following. a first credential request, and/or a first transaction request. In embodiments, the first transaction request may include a request to transfer a first amount of digital asset ("the payment") from a first user public address associated with the participant to the first smart contract address 7704. The first amount of digital asset may correspond to a payment for the credential request (e.g., VPN) services of the first smart contract 7702. In embodiments the first amount of digital asset may correspond to the aforementioned payment and a fee for miners of the blockchain 6108. The transaction request, in embodiments, may be digitally signed with a participant digital signature. The participant digital signature may, in embodiments, be based on a participant private key. In embodiments, the participant private key is an RSA private key.

In embodiments, the first transaction request may be executed upon receipt.

In embodiments, the administrator computer system may determine the first message was received by monitoring the first smart contract address 7704 on the blockchain 6108. In embodiments, the monitoring of the first smart contract address 7702 may be performed by administrator computer system. In embodiments, the first smart contract 7702 may generate and send a message to first designated public address 7708 and/or the second designated public address 7710, notifying the administrator that the first message was received.

In embodiments, the administrator computer system may employ a third party to monitor the first smart contract address 7704 for any activity (e.g., a first message was received). To enable a third party to monitor the first smart contract address 7804, the administrator computer system may generate and transmit monitoring information to a third-party computer system associated with the third party via network 125. The monitoring information, in embodiments, may the first smart contract address 7704.

In embodiments, the third-party computer system may monitor the first smart contract address 7704 for the first message. This monitoring may be continuous, in substantially real time, and/or or at predetermined intervals, to name a few. For example, the third-party computer system may only check the first smart contract address 7704 twice a day—once at 9 AM and a second time at 5 PM. In embodiments, if the third-party computer system detects the first message at the first smart contract address 7704, the third-party computer system may verify the first message includes a credential request. In embodiments, if the third-party computer system detects a first published message at first smart contract address 7704, the third-party computer system may generate and send a notification to the administrator computer system. The notification, in embodiments, may indicate and/or include one or more of the following: (1) the first message; (2) the first user public address; (3) the first smart contract address 7804; (4) the credentials request; and/or (5) the time the first message was received by the first smart contract 7702, to name a few. In embodiments, the third-party computer system may be similar to the first user device 6104 and/or the digital asset exchange computer system 6102, described above in connection with FIG. 61A the descriptions of which applying herein.

Once a first message was detected at the first smart contract address 7702, the administrator computer system may determine the message was sent by the first user public address associated with the first user. In embodiments, upon receipt of the first message, the first smart contract 7702 may extract and/or store (e.g., on the blockchain 6108) the first credential request in accordance with the first storage instructions 7720. The first credential request, in embodiments, may be verified by the first smart contract 7702 in accordance with the second verification instructions 7714. In embodiments, upon receipt of the first message, the first smart contract 7702 may verify the payment in accordance with the first verification instructions 7712.

In embodiments, the process of FIG. 77C may continue with step S7810. At step S7810, in embodiments, the administrator computer system may determine a first payment of a first amount of digital asset associated with the first message was received at the first smart contract address 7704. In embodiments, verification may be accomplished by generating and sending a call to the first smart contract 7702 and receiving a return indicating the payment was received. In embodiments, the determination may be performed by the third-party computer system.

In embodiments, the process of FIG. 77C may continue with step S7812. At step S7812, in embodiments, the administrator computer system may obtain the first credential request. The first credential request, in embodiments, may be obtained by the administrator at the first designated public address 7708 and/or the second designated public address 7710.

In embodiments, the process of FIG. 77C may continue with step S7814. At step S7814, in embodiments, the administrator computer system may generate first executed credentials. The first executed credentials may be based on the first credential request and the second designated private key (and/or the first designated private key). In embodiments, the first executed credentials may be the first credential request digitally signed by the second designated private key (and/or the first designated private key). In embodiments, the administrator computer system may only generate the first executed credentials if the payment has been verified.

In embodiments, the process of FIG. 77C may continue with step S7816. At step S7816, in embodiments, the administrator computer system may generate a second message, from the first designated public address 7708 and/or the second designated public address 7710 to the first smart contract address 7704. The second message, in embodiments, may include the first executed credentials. In embodiments, the second message is digitally signed by at least the first designated private key and/or the second designated private key.

In embodiments, the process of FIG. 77C may continue with step S7818. At step S7818, in embodiments, the administrator computer system may send the second message from the first designated public address 7708 and/or the second designated public address 7710 to the first smart contact address 7702 via the blockchain 6108. In embodiments, upon receipt of the second message, the first smart contract 7702 may verify and/or store the first executed credentials in accordance with the third verification instructions 7716 and/or second storage instructions 7722, respectively.

In embodiments, the process of FIG. 77C may continue with step S7820. At step S7820, in embodiments, the administrator computer system may receive a second amount of digital asset. The administrator computer system may receive the second amount of digital asset, in embodiments, at the first designated public address and/or second designated public address in accordance with the transfer instructions 7724. In embodiments, the second amount of digital asset is the predetermined amount of digital asset associated with the transfer instructions 7724. In embodiments, the second amount of digital asset is the payment received by the first smart contract 7702. In embodiments, the second amount of digital asset is the payment received by the first smart contract 7702 less a third amount of digital asset. In embodiments, the third amount of digital asset may be a fee for the miners of the blockchain 6108.

In embodiments, the administrator computer system may generate a second transaction request to request the second amount of digital asset. The second transaction request, in embodiments, may be from the first designated public address 7708 and/or the second designated public address 7710 to the first smart contract address 7704. In embodiments, the second transaction request may include a request to transfer the second amount of digital asset from the first smart contract address 7704 to the first designated public address 7708 and/or the second designated public address 7710. The second transaction request, in embodiments, may be digitally signed by the first designated private key and/or the second designated private key.

Once generated, in embodiments, the second transaction request may be sent by the administrator computer system, from the first designated public address 7708 and/or second designated public address 7710 to the first smart contract address 7704 via the blockchain 6108. Upon receipt, in embodiments, the first smart contract 7702 may execute the second transaction request in accordance with the transfer instructions 7724.

The steps of the process described in connection with FIG. 77C may be rearranged or omitted.

KYC on the Blockchain

FIG. 79 illustrates a process for providing KYC and KYC services on a blockchain in accordance with exemplary embodiments of the present invention. In embodiments, the process of FIG. 79 may begin at step S7902. At step S7902, first smart contract instructions 7806 may be provided. The first smart contract instructions 7806, in embodiments, may be associated with a first smart contract 7802, which may be associated with a first smart contract address 7804. In embodiments, the first smart contract address 7804, may be associated with an underlying digital asset which is maintained on a distributed public transaction ledger maintained in the form of a blockchain 6108 by a plurality of geographically distributed computer systems. As shown in FIG. 78A, blockchain 6108 may include the first smart contract 7802, which may be associated with the first smart contract address 7804, first smart contract instructions 7806 and certificate authority information 7810.

Referring to FIG. 78B, the first smart contract instructions 7806 may include one or more of the following: first verification instructions 7812; second verification instructions 7814; third verification instructions 7816; fourth verification instructions 7818, first storage instructions 7820; second storage instructions; 7822; third storage instructions 7824; fourth storage instructions 7826; first parsing instructions 7828; second parsing instructions 7830; obtaining hash instructions 7832: challenge content instructions 7834: challenge generation instructions 7836; and/or intra-contract communication instructions 7838, to name a few.

In embodiments, the first verification instructions 7812 may indicate conditions under which a message is verified. A message received at the first smart contract address 7804, in embodiments, may be verified the message includes a digital certificate to be verified. A digital certificate, as used herein, may refer to a public key certificate for encryption and/or authentication. In embodiments, a digital certificate may include one or more of the following: a public key, identifying information about the owner of the public key, metadata relating to the digital certificate, and/or a digital signature of the public key created by the issuer of the digital certificate, to name a few. For exemplary purposes, a digital certificate may be represented by the following pseudo code:

```
Version: 3 (0x2)
Serial Number:
  2f:62:96:1b:c4:50:1f:22:68:8f:57:6d
Signature Algorithm: sha256WithRSAEncryption
Issuer: C = BE, O = GlobalSign nv-sa, CN = GlobalSign Extended Validation CA -
SHA256 - G3
Validity
  Not Before: Jul 23 17:11:12 2019 GMT
  Not After : Sep 23 22:16:02 2021 GMT
Subject: businessCategory = Private Organization, serialNumber = "September 23, 2015",
jurisdictionC = US, jurisdictionST = New York, C = US, ST = NY, L = New York, street = 600
Third Avenue 2nd floor, O = "Gemini Trust Company, LLC", CN = exchange.gemini.com
Subject Public Key Info:
  Public Key Algorithm: rsaEncryption
    RSA Public-Key: (2048 bit)
    Modulus:
      00:a4:a2:52:1c:7b:6a:4e:37:98:41:59:a5:a1:71:
```

In embodiments, the first parsing instructions 7828 may enable the first smart contract 7802 to extract one or more digital certificates from one or more received messages. For example, if a message is verified in accordance with the first verification instructions 7812, the first smart contract 7802 may extract the one or more digital certificates included in the message in accordance with the first parsing instructions 7828. In embodiments, the first parsing instructions 7828 may be in accordance with one or more of the following: ASN1 and/or X509, to name a few. In embodiments, the first verification instructions may enable the first smart contract to: determine the digital certificate is syntactically valid; determine the digital certificate structure conforms to a predetermined standard; and/or determine the issuer of the digital certificate is a trusted issuer of digital certificates, to name a few.

In embodiments, the second parsing instructions 7830 may enable the first smart contract 7802 to extract one or more digitally signed challenges from one or more received messages. A digitally signed challenge, in embodiments, may be a response to a challenge generated and/or published by the first smart contract 7802. In embodiments, the second parsing instructions 7830 may be in accordance with one or more of the following: ASN1 and/or X509, to name a few.

In embodiments, the first storage instructions 7820 may be instructions to store and/or access certificate authority information 7810. Referring to FIG. 78C, the first storage instructions may include one or more of the following: the trusted certificate authority public key database 7840; hashes of trusted certificate authority public key database 7842; and/or verified digital certificate database 7844. The verified digital certificate database 7844 may include one or more of the following: one or more verified digital certificates; a list corresponding to one or more verified digital certificates; hashes of one or more verified digital certificates; and/or a list corresponding to the hashes of one or more verified digital certificates, to name a few.

In embodiments, the trusted certificate authority database 7840 may include a list of trusted issuers of digital certificates. An example of such a list is shown in the below table:

Exemplary Trusted Certificate Authority Public Key List

| Issuer | Public Address | Trusted? |
|---|---|---|
| Issuer 1 | 1CC3X2gu58d6wXUWMffpuzN9JAfTUWu4Kj | Yes |
| Issuer 2 | 1CC3Xdaegae6wXUWMffpuzN9JAasfdgve208 | Yes |
| Issuer 3 | VIENLN1390dafnjas9gh98y2t3nlvasoihdne | Yes |
| Issuer 4 | 0032JKLIUOINViunlalsiune82_1lkasjfh.10 | No |
| Issuer 5 | JKSdfhuawanvawn398097125n13287un3nl | Yes |

As shown in the above table, the above list may include an issuer identifier (e.g., Issuer 1, Issuer 2 . . . Issuer 5), the public address associated with said issuer identifier, and/or whether the issuer is trusted. In embodiments, the list may only include trusted issuers. In embodiments, a separate list of not trustworthy issuers may be stored with the certificate authority information 7810. In embodiments, the certificate authority information 7810 may also include a list of public keys associated with one or more trusted certificate authorities and/or one or more trusted issuers of certificates.

In embodiments, the trusted certificate authority information 7810 may include hashes of the trusted certificate authority public key database 7842. The hashes of the trusted certificate authority public keys, may, for example, be generated by receiving hashes of verified issuers and/or be generated by applying a hash algorithm to the public key associated with the trusted issuer. The hashes of the trusted certificate authority public keys, may, for example, be a list. An example of such a list is shown in the below table:

Exemplary Trusted Certificate Authority Hash of Public Key List

| User | Hash of Digital Asset Address | Trusted? |
|---|---|---|
| Issuer 1 | UWMffpuzN9JAfTUWu4Ki | Yes |
| Issuer 2 | 1CC3Xdaegae6wXUWMffp | Yes |
| Issuer 3 | LN1afnjas9gh98y2t3ndne | Yes |
| Issuer 4 | basd_1lkasjfh.10bfase24s | No |
| Issuer 5 | bq38097125n13287un3nl | Yes |

As shown in the above table, the above list may include an issuer identifier (e.g., Issuer 1, Issuer 2 . . . Issuer 5), the hash of public address associated with said issuer identifier, and/or whether the issuer is trusted. In embodiments, the list may only include trusted issuers. In embodiments, a separate list of not trustworthy issuers may be stored with the certificate authority information 7810.

Referring back to FIG. 78B, in embodiments, as mentioned above, the first smart contract instructions 7806 may include second verification instructions 7814. In embodiments, the second verification instructions may indicate conditions under which the first smart contract 7802 verifies one or more digital certificates. In embodiments, the second verification instructions may include one or more instructions to: verify whether one or more digital certificates are syntactically valid; verify a structure of one or more digital certificates; verify one or more issuers of one or more digital certificates are trusted issuers of digital certificates; verify one or more issuer private keys associated with one or more issuers of one or more digital certificates; and/or verify whether one or more digital certificates are expired based on a current time and an expiration date associated with the one or more digital certificates (e.g., if the current time is the expiration date and/or after the expiration date, the digital certificate is expired, if the current time is before the expiration date or the expiration date, the digital certificate may not be expired), to name a few.

In embodiments, the third verification instructions 7816 may be instructions to verify a payment associated with a message including a digital certificate. In embodiments, the third verification instructions may include one or more instructions to: verify that a payment was received, verify the type of digital asset received, verify the value of digital asset received, and/or verify the value of digital asset received is equal to the value of digital asset required for payment for the KYC services. The value required, in embodiments, may be a predetermined amount of digital asset.

In embodiments, obtaining hash instructions 7832 may indicate conditions under which the first smart contract 7802 obtains a hash of the last block of the blockchain 6108 (e.g., the most recent block of the blockchain 6108).

In embodiments, challenge content instructions 7834 may define one or more contents of a challenge. The challenge, in embodiments, may be generated by the first smart contract 7802 in response to a verified message. In embodiments, the one or more contents of a challenge may include: a hash of the last block of the blockchain 6108; an extracted digital certificate associated with a received message; a public address on the blockchain 6108 associated with an issuer of the extracted digital certificate; and/or a request for a digital signature based on a private key associated with the extracted digital certificate, to name a few. In embodiments, the request for a digital signature may be generated by the first smart contract 7802. In embodiments, the request may be generated in accordance with the challenge generation instructions 7836.

In embodiments, the challenge generation instructions 7836 may indicate conditions under which challenges are generated in accordance with the challenge content instructions 7834. Conditions under which challenges are generated may include one or more of the following: a message is verified; a payment is verified; and/or a digital certificate is verified, to name a few.

In embodiments, a challenge generated in accordance with the challenge content instructions 7834 and/or the challenge generation instructions 7836 may be one or more of the following: an HTTP-01 challenge; a DNS-01 Challenge; a TLS NSI-01 challenge; a TLS-ALPN-01 challenge and/or a challenge that utilizes LockID, to name a few.

In embodiments, the second storage instructions 7822 may be instructions to store challenges that were generated in accordance with the challenge generation instructions 7836. In embodiments, an entity who is using the KYC services of the first smart contract 7802, may be required to respond to a challenge that is generated by the first smart contract 7802. Said entity, in embodiments, may be able to obtain the challenge once the first smart contract 7802 stores the challenge as part of the blockchain 6108, in accordance with the second storage instructions 7822. In embodiments, the first smart contract 7802 may store challenges after the first smart contract 7802 generates the challenge and/or verifies the generated challenge.

In embodiments, the fourth verification instructions 7818 may be instructions enabling the first smart contract 7802 to verify a response to a challenge generated in accordance with the challenge generation instructions 7836. In embodiments, the fourth verification instructions 7818 may be instructions that are in accordance with EIP-198.

In embodiments, the third storage instructions 7824 may be instructions which indicate conditions under which digital certificates are stored on the blockchain and/or with the certificate authority information 7810. In embodiments, an extracted digital certificate may be stored with the certificate authority information 7810 with information associated with the issuer of the extracted digital certificate. In embodiments, the conditions under which digital certificates are stored may include one or more of the following: an associated message has been verified; the extracted digital certificate associated with the received message has been verified; a received response to a challenged associated with the received message has been verified; and/or a received payment associated with the received message has been verified, to name a few. In embodiments, conditions under which one or more messages including a digital certificate are stored include a first condition directing the first smart contract to store the one or more received credential requests after a respective payment associated with a respective message including a digital certificate of the one or more received messages is received.

In embodiments, the fourth storage instructions 7826 may be instructions which indicate conditions under which responses to challenges and/or challenges generated in accordance with the challenge generation instructions 7836 are stored on the blockchain. In embodiments, the conditions under which responses to challenges and/or challenges generated are stored may include one or more of the following: an associated message has been verified; the extracted digital certificate associated with the received message has been verified; a received response to a challenged associated with the received message has been verified; and/or a received payment associated with the received message has been verified, to name a few.

In embodiments, the intra-contract communication instructions 7838 may indicate conditions under which the first smart contract 7802 verifies one or more digital certificates provided by a smart contract other than the first smart contract 7802 (e.g., a second smart contract associated with a second smart contract address on the blockchain 6108). The intra-contract communication instructions 7838 may enable other smart contract to utilize KYC services of the first smart contract 7802.

In embodiments, the first smart contract and contract instructions may be generated and published by an administrator (e.g., digital asset exchange computer system 6102) and/or a third-party computer system.

Referring back to FIG. 79, the process of FIG. 79 may continue with step S7904. At step S7904, in embodiments, a participant device (e.g., the first user device 6104) associated with a participant may generate a first message. The first message, in embodiments, may include one or more of the following: a first digital certificate digitally signed by an issuer digital signature, a public address to be verified by the first smart contract 7802 (e.g., an unverified public address), a first transaction request, a public key associated with the issuer of the first digital certificate, a private key associated with the issuer of the first digital certificate, and/or a public address associated with the participant to name a few. In embodiments the public key associated with the issuer of the first digital certificate is a Rivest-Shamir-Adleman (RSA) public key. In embodiments, the private key associated with the issuer of the first digital certificate is an RSA private key. In embodiments, the issuer digital signature may be based on an issuer private key associated with the issuer of the first digital certificate.

In embodiments, the unverified public address may be one or more of the following: a public address associated with the issuer of the first digital certificate; a public address associated with the participant; a public address not associated with the issuer of the first digital certificate; a public address not associated with the participant; and/or a public address not associated with the participant and not associated with the issuer of the first digital certificate, to name a few.

In embodiments, the first transaction request may include a request to transfer a first amount of digital asset from a participant public address associated with the participant to the first smart contract address 7804. The first amount of digital asset may correspond to a payment for the KYC services of the first smart contract 7802. In embodiments the first amount of digital asset may correspond to the aforementioned payment and a fee for miners of the blockchain 6108. The transaction request, in embodiments, may be digitally signed with a participant digital signature. The participant digital signature may, in embodiments, be based on a participant private key. In embodiments, the participant private key is an RSA private key.

In embodiments, the participant may be one or more of the following: the issuer of the first digital certificate, an individual, a user, a customer, a company, an administrator, an organization, a digital asset exchange, an entity, a government body, a municipality, and/or a country, to name a few. The participant device, as described herein, may be similar to the first user device 6104, as described in connection with FIG. 61A, the description of which applying herein. The participant public address, in embodiments, may be similar to the first user public address described in connection with FIGS. 63A-63F, the description of which applying herein. The participant public address, in embodiments, may be associated with a participant public key and corresponding participant private key. The participant public key and corresponding participant private key may be similar to the first user public key and first user private key described in connection with FIGS. 63A-63F, the description of which applying herein.

In embodiments, the process of FIG. 79 may continue with step S7906. At step S7906, in embodiments, the participant device (e.g., the first user device 6104) may transmit the first message to the first smart contract address 7804 via the blockchain 6108.

In embodiments, upon receipt of the first message, the first smart contract 7802, by the execution of the first smart contract instructions 7806, may begin a KYC process to verify the public address to be verified by the first smart contract 7802 ("the unverified public address"). An exemplary beginning of a KYC process may start with verifying, in accordance with the first verification instructions 7812, that the first message includes the first digital certificate. If the first message does not include the first digital certificate, the first smart contract 7802 may not perform the KYC process and/or may generate and publish a notification on the blockchain 6108 indicating the deficiencies of the first message.

In embodiments, the process may continue with verifying, in accordance with the third verification instructions 7816, the receipt of the first amount of digital asset. In embodiments, the receipt of the first amount of digital asset may be verified by determining whether the first amount of digital asset is equal to the required payment amount. If the payment is not verified, the first smart contract 7802 may not perform the KYC process and/or may generate and publish a notification on the blockchain 6108 indicating the deficiencies of the first message.

In embodiments, the process may continue with extracting, in accordance with the first parsing instructions 7828, the first digital certificate. In embodiments, the process may continue with storing, in accordance with the first storage instructions 7820, the unverified public address. The unverified public address may be stored, in embodiments, with the certificate authority information 7810.

In embodiments, the process may continue with verifying, in accordance with the first verification instructions 7812 and/or the second verification instructions 7814, the first message. In embodiments, the first message may be verified by performing one or more of the following: (1) determining that the first digital certificate is syntactically valid (e.g., based on a predetermined acceptable syntax which may be stored as part of the first smart contract instructions 7806); (2) determining that the first digital certificate structure conforms to a predetermined standard (e.g., a predetermined standard that may be stored as part of the first smart contact instructions 7806); and/or (3) determining the issuer of the first digital certificate is a trusted issuer of digital certificates (e.g., based on accessing and comparting the received issuer information with stored issuer information stored with the certificate authority information 7810), to name a few. In embodiments, the issuer of the first digital certificate may be determined as a trusted issuer by verifying the issuer digital signature. If the first message is not verified, the first smart contract 7802 may not perform the KYC process and/or may generate and publish a notification on the blockchain 6108 indicating the deficiencies of the first message.

In embodiments, the process may continue with obtaining, in accordance with the obtaining hash instructions 7832, a hash of the last block of the blockchain 6108. The last hash of the blockchain 6108, in embodiments, may be stored by the first smart contract 7802 as part of the blockchain 6108. The hash of the last block of the blockchain 6108 (e.g., the most recent block of the blockchain 6108), in embodiments, may be obtained in response to one or more of the following: receiving the first message, verifying the first message includes a digital certificate, verifying the first message, verifying the first payment, and/or extracting the digital signature. The hash of the last block of the blockchain 6108 may be obtained, in embodiments, on regular intervals (e.g., hourly, daily, weekly, monthly, and/or yearly, to name a few).

In embodiments, the process may continue with generating, in accordance with the challenge content instructions 7834 and/or the challenge generation instructions 7836, a challenge. The challenge, in embodiments, may be generated in response to one or more of the following: receiving the first message, verifying the first message includes a digital certificate, verifying the first message, verifying the first payment, and/or extracting the digital signature. In embodiments, the challenge may include one or more of the following: the hash of the last block of the blockchain 6108, the first digital certificate, a public address on the blockchain 6108 associated with the issuer of the first digital certificate, a time limit for responding, and/or a request for the issuer digital signature, to name a few. In embodiments the challenge may be one or more of the following: an HTTP-01 challenge; a DNS-01 Challenge; a TLS NSI-01 challenge; a TLS-ALPN-01 challenge and/or a challenge that utilizes LockID, to name a few. In embodiments, once the challenge is generated, the challenge may be stored as part of the blockchain 6108 in accordance with the second storage instructions 7822. In embodiments, the challenge may only be responded to within a predetermined amount of time. If the challenge is not responded to within the predetermined amount of time, the first smart contract 7802 may not perform the KYC process and/or may generate and publish a notification on the blockchain 6108 indicating the deficiencies of the timeliness of the response to the challenge.

Referring back to FIG. 79, the process of FIG. 79 may continue with step S7908. At step S7908, in embodiments, the first smart contract address 7804 may be monitored to determine the challenge has been generated and saved as part of the blockchain 6108. In embodiments, the monitoring of the first smart contract address 7804 may be performed by the participant device (e.g., the first user device 6104). In embodiments, the first smart contract 7802 may generate and send a message to the participant public address, notifying the participant that the challenge has been generated and published.

In embodiments, the participant device may employ a third party to monitor the first smart contract address 7804 for any activity (e.g., a challenge for the participant). To enable a third party to monitor the first smart contract address 7804, the participant device may generate and transmit monitoring information to a third-party computer system associated with the third party via network 125. The monitoring information, in embodiments, may include one or more of the following: (1) the first smart contract address 7804; (2) the issuer public address; (3) the unverified public address; (4) the participant public address (e.g., associated with the first user public key 6120); (5) the first message and/or (6) the time and/or date the first message was transmitted to the first smart contract address 7804, to name a few.

In embodiments, the third-party computer system may monitor the first smart contract address 7804 for the challenge. This monitoring may be continuous, in substantially real time, and/or or at predetermined intervals, to name a few. For example, the third-party computer system may only check the first smart contract address 7804 for a challenge 30 after the first message has been sent. In embodiments, if the third-party computer system detects a challenge from the first smart contract address 7804, the third-party computer system may verify the challenge is associated with the first message, the participant, and/or the issuer of the first digital certificate, to name a few. In embodiments, if the third-party computer system detects a challenge from the first smart contract address 7804, the third-party computer system may generate and send a notification to the participant device. The notification, in embodiments, may indicate one or more of the following: (1) the challenge; (2) the first smart contract address 7804; and/or (3) the time the challenge was published, to name a few. In embodiments, the third-party computer system may be similar to the first user device 6104 and/or the digital asset exchange computer system 6102, described above in connection with FIG. 61A the descriptions of which applying herein.

In embodiments, the process of FIG. 79 may continue with step S7910. At step S7910, in embodiments, the challenge is obtained. As mentioned above with respect to step S7908, in embodiments, the challenge may be obtained by the third-party computer system and/or the participant device, to name a few. In embodiments, the participant, participant device, and/or third-party computer system may verify the challenge by verifying that the challenge is associated with one or more of the following: the first message, the participant, and/or the issuer of the first digital certificate, to name a few. In embodiments, if the challenge cannot be verified, the monitoring step may continue until a challenge associated with the first message, the participant, and/or the issuer of the first digital certificate is published. In embodiments, the verified challenge may be saved by the participant device.

In embodiments, the process of FIG. 79 may continue with step S7912. At step S7912, in embodiments, a digitally signed challenge (e.g., the response to the challenge) is obtained. In embodiments, the digitally signed challenge may be obtained by the third-party computer system and/or the participant device, to name a few. In embodiments, the digitally signed challenge may be obtained by generating the digitally signed challenge based on one or more of the following: the first challenge, the issuer private key, the participant private key, the participant public key, the issuer public key, a hash of the issuer private key, a hash of the participant private key, a hash of the issuer public key, and/or a hash of the participant public key. For example, the digitally signed challenge may be generated by digitally signing the challenge with the issuer private key.

In embodiments, the process of FIG. 79 may continue with step S7914. At step S7914, in embodiments, the participant device and/or the third-party computer system may generate a second message. The second message, in embodiments, may include the digitally signed challenge. The second message, in embodiments, may include a second transaction request. In embodiments, the second transaction request may be generated (e.g., by the participant device) and include a request to transfer a second amount of digital asset from the participant public address to the first smart contract address 7804. The second amount of digital asset, in embodiments, may represent a fee associated with a response to the challenge and/or a fee for miners of the blockchain 6108, to name a few. The second message, in embodiments, is digitally signed by one or more of the following: the participant private key and/or the issuer private key, to name a few.

In embodiments, the process of FIG. 79 may continue with step S7816. At step S7916, in embodiments, the participant device (e.g., the first user device 6104) may transmit the second message to the first smart contract address 7804 via the blockchain 6108.

In embodiments, upon receipt of the second message, the first smart contract 7802, by the execution of the first smart contract instructions 7806, may finish the KYC process to verify the unverified public address. Continuing the exemplary KYC process, the process may continue with extracting, in accordance with the second parsing instructions 7830, the digitally signed challenge. In embodiments, the process may continue with verifying, in accordance with the fourth verification instructions 7818, the digitally signed challenge. In embodiments, the receipt of the second amount of digital asset may also be verified in accordance with the third verification instructions 7816. In embodiments, the receipt of the second amount of digital asset may be verified by determining whether the second amount of digital asset is equal to the required payment amount. If the digitally signed challenge and/or payment are not verified, the first smart contract 7802 may not perform the KYC process and/or may generate and publish a notification on the blockchain 6108 indicating the deficiencies of the second message. If verified, the first smart contract 7802 has verified the digitally signed challenge, and, accordingly, the unverified (now verified) public address.

In embodiments, the process may continue with storing, in accordance with the fourth storage instructions 7826, the digitally signed challenge as part of the blockchain 6108. In embodiments, the digitally signed challenge, the verified public address, an identifier associated with the issuer, and/or the issuer public address may be stored with the certificate authority information 7810.

In embodiments, the process may continue with generating a confirmation message indicating the unverified public address is now verified. The confirmation message, in embodiments, may be saved as part of the blockchain. In embodiments, the confirmation message may be sent from the first smart contract address 7804 to the participant public address via the blockchain 6108.

In embodiments, the process of FIG. 79 may continue with monitoring the first smart contract address 7804 for the confirmation message. The monitoring of the first smart contract address 7804 herein may be similar to the description of step S7908, the description of which applying herein. Once detected, in embodiments, the confirmation message may be obtained and verified by the participant device. In embodiments, the confirmation message may be detected, obtained, verified, and/or sent to the participant device by the third-party computer system.

In embodiments, as described above, a digital certificate may be revoked (e.g., the digital certificate has expired). In embodiments, the first smart contract instructions 7804 may include revocation check instructions which may indicate conditions where and how the first smart contract 7802 will perform a revocation check. In embodiments, in accordance with the revocation check instructions, the revocation check may be an Online Certificate Statius Protocol (OCSP) check. To perform an OCSP check, in embodiments, the first smart contract 7802 may generate and send a message including a serial number (e.g., a digital certificate identifier) to a third party (e.g., a trusted entity, one or more third parties, one or more trusted entities, to name a few) to determine whether the digital certificate associated with the serial number has been revoked. In response, the first smart contract 7802 may receive a message with revocation information regarding the certificate (e.g., the issuer, whether the issuer is trusted, and/or whether the certificate is revoked, to name a few). The first smart contract 7802 may store the revocation information as part of the blockchain 6108 with a timestamp associated with the time and/or date of the revocation check occurred, based on the timestamp in the OCSP response. The revocation check, in embodiments, may be part of the initial application to KYC a blockchain address (e.g., the unverified address).

In embodiments, a participant may be in custody of a digital certificate the first smart contract 7802 has determined to be revoked. The participant in custody of the revoked digital certificate, in embodiments, may convince the first smart contract 7802 that said digital certificate has not been revoked. The participant may generate and send a message to the first smart contract address 7804 to request proof of revocation. In embodiments, the first smart contract 7802 may respond by generating and sending a message to the participant public address. The message may include the revocation information.

In embodiments, the first smart contract 7802 may check the timestamp associated with the revocation information. If, in embodiments, more than a predetermined amount of time has elapsed since the most recent revocation check, the first smart contract may perform an additional revocation check. The received revocation information in response to the additional revocation check may, in embodiments be sent to the participant public address. If the revocation check finds the digital certificate is not revoked, the message may indicate the non-revoked status and continue the KYC process. In embodiments, if the revocation check finds the digital certificate is revoked, the message may confirm the revocation of the digital certificate In embodiments, the revocation check instructions may be called and/or invoked by the first smart contract 7802 repeatedly. In embodiments, the repeated revocation check may allow for proving that a certificate remains valid over time. For example, the participants and/or issuers can invoke a function on the first smart contract 7802 in accordance with the revocation check instructions every week to demonstrate the revocation status of one or more digital certificates. After each successful demonstration, the first smart contract 7802 may update the saved timestamp associated with the revocation information in accordance with the revocation check instructions. The additional revocation information may, in embodiments, be made available to other smart contracts, in accordance with the intra-contract communication instructions 7838, which query the first smart contract 7802. For example, other smart contracts on the blockchain 6108 can implement a rule to the effect that a blockchain address must have been KYC'ed and checked for revocation within the last 30 days.

The steps of the process described in connection with FIG. 79 may be rearranged or omitted.

Now that embodiments of the present invention have been shown and described in detail, various modifications and improvements thereon can become readily apparent to those skilled in the art. Accordingly, the exemplary embodiments of the present invention, as set forth above, are intended to be illustrative, not limiting. The spirit and scope of the present invention is to be construed broadly.

What is claimed:

1. A method of issuing electronic payments using an amount of stable value digital asset tokens comprising steps of:

(a) obtaining, by an administrator system associated with an administrator, a first sum of stable value digital asset tokens in a first designated public address associated with a first blockchain, wherein the first sum of stable value digital asset tokens are backed by a second amount of a second digital asset maintained by a custodian based on a fixed ratio of the stable value digital asset token to the second digital asset, wherein the first designated public address corresponds to a first designated public key and a corresponding first designated private key;

wherein the stable value digital asset token is maintained in a stable value digital asset token database stored on a first distributed transaction ledger maintained in a form of the first blockchain by a plurality of geographically distributed computer systems in a first blockchain network;

wherein the second digital asset is maintained in a second digital asset database stored on a second distributed transaction ledger maintained in the form of a second blockchain by a plurality of geographically distributed computer systems in a second blockchain network;

the stable value digital asset token database comprising a log of stable value digital asset tokens including:

(i) a first set of digital asset addresses, each respective digital asset address of the first set of digital asset addresses in the first distributed transaction ledger maintained by the plurality of geographically distributed computer systems in the first blockchain network, the first set of digital asset addresses including a first respective digital asset address for each respective stable value digital asset first token holder; and (ii) a respective digital asset first token amount for each first respective stable value digital asset token address associated with a respective stable value digital asset token holder, wherein the stable value digital asset tokens are issued by a stable value digital asset token issuer;

(b) obtaining, by the administrator system, (A) each respective digital asset address of a second set of digital asset addresses for each respective digital asset first token holder of a plurality of digital asset first token holders; and (B) a respective digital asset first token amount associated with each respective digital asset address of the second set of digital asset addresses, from a digital asset first token database stored on a second set of one or more computer readable media, the one or more computer readable media associated with a digital asset first token issuer system associated with a digital asset first token issuer, wherein the digital asset first token database comprises a log of digital asset first tokens including:

(i) the second set of digital asset addresses, each respective digital asset address of the second set of digital asset addresses in the distributed transaction ledger in the form of the blockchain maintained by the plurality of geographically distributed computer systems in the first blockchain network, the second set of digital asset addresses including a second respective digital asset address for each respective stable value digital asset token holder; and (ii) the respective digital asset first token amount associated with each respective second digital asset address;

(c) determining, by the administrator system, a respective payment amount in stable value digital asset tokens to be made to each respective digital asset address of the second set of digital asset addresses wherein the payment amount is determined on a pro rata basis with respect to a sum of the respective digital asset first token amounts for the second set of digital asset addresses;

(d) generating, by the administrator system, transaction instructions to transfer the respective payment amount of stable value digital asset tokens from the designated public address to each respective digital asset address of the second set of digital asset addresses with a digital signature based on the first designated private key;

(e) publishing, by the administrator system to the first blockchain, the transaction instructions, wherein the plurality of geographically distributed computer systems implement the transaction instructions to transfer the respective payment amount of stable value digital asset tokens to each respective digital asset address of the second set of digital asset addresses; and (f) confirming, by the administrator system, that each digital asset address of the second set of the digital asset addresses received the determined respective payment amount in stable value digital asset tokens based on reference to the blockchain and that the respective digital asset first token amount for each digital asset address of the second set of digital asset address has not changed.

2. The method of claim 1, wherein the blockchain is an Ethereum blockchain.

3. The method of claim 1, wherein the blockchain is a Bitcoin blockchain.

4. The method of claim 1, further comprising:

(g) notifying, by the administrator system, each digital asset address of the second set of the digital asset addresses of each respective transfer of stable value digital asset tokens to each respective digital asset address of the second set of digital asset addresses.

5. The method of claim 1, wherein the blockchain is a Stellar blockchain.

6. The method of claim 1, wherein the administrator is a regulated digital asset exchange.

7. The method of claim 1, wherein the digital asset first token is a security registered with a government authority.

8. The method of claim 1, wherein the digital asset first token is a debt security and the electronic payments are interest.

9. The method of claim 1, wherein the digital asset first token is an equity security and the electronic payments are dividends.

10. The method of claim 1, wherein the digital asset first token is secured by intellectual property rights and the electronic payments are royalties.

11. The method of claim 1, wherein the first blockchain is based on a mathematical protocol for proof of work.

12. The method of claim 11, wherein the mathematical protocol is open source.

13. The method of claim 1, wherein the first blockchain is based on a mathematical protocol for proof of stake.

14. The method of claim 13, wherein the mathematical protocol is open source.

15. The method of claim 1, wherein the first blockchain is based on a cryptographic mathematical protocol.

16. The method of claim 1, further comprising a step of publishing, by the administrator system to a side ledger, the transaction instructions associated with transferring the respective payment amount of stable value digital asset tokens to each respective digital asset address of the second set of digital asset addresses and the publishing step (e) includes publishing the transaction instructions from the side ledger to the distributed asset ledger periodically or aperiodically.

17. The method of claim 1 further comprising steps of:

(g) receiving, at the digital asset first token issuer system, from at least one digital asset first token holder, a payment request prior to the obtaining step (a), the payment request including:

(i) the digital asset address of the digital asset first token holder; and (ii) a request to transfer a payment amount of stable value digital asset tokens to the digital asset address of the digital asset first token holder; and (h) confirming, at the digital asset first token issuer system, that:

(i) the digital asset address of the digital asset first token holder is valid;

(ii) the digital asset first token amount of digital asset first tokens associated with the digital address of the digital asset first token holder is more than zero; and (iii) the digital asset first token holder is entitled to payment.

18. The method of claim 1, wherein the digital asset first token database is maintained and stored on the plurality of geographically distributed computer systems in the first blockchain network.

19. The method of claim 1, wherein the digital asset first token database is maintained on a sidechain, separate from the blockchain network, wherein information on the sidechain is published and stored on the blockchain network periodically or aperiodically.

20. The method of claim 1, wherein the generating step (d) includes generating, by the administrator system, transaction instructions for the first sum of stable value digital asset tokens by updating the stable value digital asset token database to reserve stable value digital asset tokens in the amount of the first sum.

21. The method of claim 1, wherein the payment amount relates to a dividend to be paid based on ownership of each digital asset first token.

22. The method of claim 1, wherein the payment amount relates to a royalty to be paid based on ownership of each digital asset first token.

23. The method of claim 1, wherein the payment amount relates to interest to be paid based on ownership of each digital asset first token.

24. The method of claim 1, wherein the first blockchain network uses a byzantine fault tolerance protocol as a consensus mechanism.

25. The method of claim 1, wherein the second digital asset is Bitcoin.

26. The method of claim 1, wherein the second digital asset is Bitcoin Cash.

27. The method of claim 1, wherein the second digital asset is Stellar.

28. The method of claim 1, wherein the second digital asset is Filecoin.

29. The method of claim 1, wherein the second digital asset is Litecoin.

30. The method of claim 1, wherein the second digital asset is Tezos.

31. The method of claim 1, wherein the second digital asset is Zcash.

32. The method of claim 1, wherein the second digital asset is Polkadot.

33. The method of claim 1, wherein the second digital asset is Atom.

34. The method of claim 1, wherein the digital asset stable value tokens are issued by the stable value digital asset token issuer through one or more nodes associated with the stable value digital asset token issuer.

* * * * *